US009183560B2

(12) United States Patent
Abelow

(10) Patent No.: US 9,183,560 B2
(45) Date of Patent: Nov. 10, 2015

(54) REALITY ALTERNATE

(76) Inventor: Daniel H. Abelow, Longwood, FL (US)

(*) Notice: Subject to any disclaimer, the term of this patent is extended or adjusted under 35 U.S.C. 154(b) by 709 days.

(21) Appl. No.: 13/068,942

(22) Filed: May 24, 2011

(65) Prior Publication Data

US 2012/0069131 A1 Mar. 22, 2012

Related U.S. Application Data

(60) Provisional application No. 61/396,644, filed on May 28, 2010, provisional application No. 61/403,896, filed on Sep. 22, 2010.

(51) Int. Cl.

| | |
|---|---|
| ***G06Q 20/00*** | (2012.01) |
| ***G06Q 30/02*** | (2012.01) |
| ***G06Q 10/06*** | (2012.01) |
| ***G06Q 10/10*** | (2012.01) |
| ***G06Q 30/06*** | (2012.01) |
| ***G06Q 40/00*** | (2012.01) |

(52) U.S. Cl.

CPC .............. *G06Q 30/02* (2013.01); *G06Q 10/067* (2013.01); *G06Q 10/10* (2013.01); *G06Q 30/0601* (2013.01); *G06Q 40/12* (2013.12)

(58) Field of Classification Search

USPC .......................................................... 705/51

See application file for complete search history.

(56) References Cited

U.S. PATENT DOCUMENTS

| | | | |
|---|---|---|---|
| 774,250 | A | 11/1904 | Hubbell |
| 774,251 | A | 11/1904 | Hubbell |
| 776,326 | A | 11/1904 | Hubbell |

(Continued)

FOREIGN PATENT DOCUMENTS

| | | |
|---|---|---|
| WO | WO2011/149558 | 12/2011 |
| WO | WO2011/149558 | 3/2012 |

OTHER PUBLICATIONS

Matti Koskimies, "Composing Services in SOA: Workflow Design, Usage and Patterns," pp. 1-31 (2006).

(Continued)

*Primary Examiner* — John Hayes
*Assistant Examiner* — John M Winter
(74) *Attorney, Agent, or Firm* — Fish & Richardson P.C.

(57) ABSTRACT

Among other things, we describe a reality alternative to our physical reality, named the Expandaverse, that includes multiple digital realities that may be continuously created, broadcast, accessed, and used interactively. In what we call an Alternate Reality Teleportal Machine (ARTPM), some elements of the digital reality(ies) can be implemented using and providing functions that include: devices, architectures, processing, sensors, translation, speech recognition, remote controls, subsidiary devices usage, virtual Teleportals on alternate devices, presence, shared planetary life spaces, constructed digital realities, reality replacements, filtered views, data retrieval in constructed views, alternate realities machine(s), multiple identities, directories, controlled boundaries, life space metrics, boundaries switching, property protection, publishing/broadcasting, digital events, events location/joining, revenues, utility(ies), infrastructure, services, devices management, business systems, applications, consistent customizable user interface, active knowledge, optimizations, alerts, reporting, dashboards, switching to "best", marketing and sales systems, improvement systems, user chosen goals, user management, governances, digital freedom from dictatorships, photography, and entertainment.

13 Claims, 318 Drawing Sheets

(56) References Cited

U.S. PATENT DOCUMENTS 890,770 A 6/1908 Hubbell
923,179 A 6/1909 Hubbell
1,180,648 A 4/1916 Hubbell
2,102,625 A 12/1937 Hubbell, Jr.
3,286,051 A 11/1966 Mackiewicz
4,866,434 A 9/1989 Keenan
4,984,152 A 1/1991 Muller
5,107,443 A 4/1992 Smith et al.
5,228,077 A 7/1993 Darbee
5,251,294 A 10/1993 Abelow
5,255,313 A 10/1993 Darbee
5,471,616 A 11/1995 Johnson et al.
5,495,576 A 2/1996 Ritchey
5,497,244 A 3/1996 Chargin, Jr. et al.
5,503,040 A 4/1996 Wright
5,515,511 A 5/1996 Nguyen et al.
5,519,704 A 5/1996 Farinacci et al.
5,530,861 A 6/1996 Diamant et al.
5,543,842 A 8/1996 Xu et al.
5,548,324 A 8/1996 Downs et al.
5,608,850 A 3/1997 Robertson
5,625,405 A 4/1997 DuLac et al.
5,636,211 A 6/1997 Newlin et al.
5,642,498 A 6/1997 Kutner
5,655,086 A 8/1997 Jury et al.
5,655,214 A 8/1997 Mullett
5,657,096 A 8/1997 Lukacs
5,668,622 A 9/1997 Charbonnier et al.
5,675,739 A 10/1997 Eilert et al.
5,684,950 A 11/1997 Dare et al.
5,692,193 A 11/1997 Jagannathan et al.
5,745,126 A 4/1998 Jain et al.
5,751,967 A 5/1998 Raab et al.
5,764,639 A 6/1998 Staples et al.
5,764,730 A 6/1998 Rabe et al.
5,781,198 A 7/1998 Korn
5,781,246 A 7/1998 Alten et al.
5,790,794 A 8/1998 DuLac et al.
5,797,126 A 8/1998 Helbling et al.
5,812,977 A 9/1998 Douglas
5,813,006 A 9/1998 Polnerow et al.
5,819,084 A 10/1998 Shapiro et al.
5,828,851 A 10/1998 Nixon et al.
5,850,340 A 12/1998 York
5,850,352 A 12/1998 Moezzi et al.
5,852,743 A 12/1998 Yeh
5,864,480 A 1/1999 Ladd
5,864,874 A 1/1999 Shapiro
5,873,022 A 2/1999 Huizer et al.
5,878,274 A 3/1999 Kono et al.
5,883,610 A 3/1999 Jeon
5,892,828 A 4/1999 Perlman
5,894,266 A 4/1999 Wood, Jr. et al.
5,896,561 A 4/1999 Schrader et al.
5,903,453 A 5/1999 Stoddard II
5,905,436 A 5/1999 Dwight et al.
5,918,227 A 6/1999 Polnerow et al.
5,923,380 A 7/1999 Yang et al.
5,925,103 A 7/1999 Magallanes et al.
5,926,794 A 7/1999 Fethe
5,937,197 A 8/1999 Jury
5,944,824 A 8/1999 He
5,956,025 A 9/1999 Goulden et al.
5,959,751 A 9/1999 Darbee et al.
5,963,215 A 10/1999 Rosenzweig
5,964,886 A 10/1999 Slaughter et al.
5,982,420 A 11/1999 Ratz
5,983,237 A 11/1999 Jain et al.
5,987,232 A 11/1999 Tabuki
5,991,073 A 11/1999 Woodgate et al.
5,997,476 A 12/1999 Brown
5,999,208 A * 12/1999 McNerney et al. ........ 348/14.08
5,999,908 A 12/1999 Abelow
6,003,072 A 12/1999 Gerritsen et al.
6,012,961 A 1/2000 Sharpe, III et al.
6,014,134 A 1/2000 Bell et al.
6,020,863 A 2/2000 Taylor
6,021,403 A 2/2000 Horvitz et al.
6,022,273 A 2/2000 Gabai et al.
6,023,302 A 2/2000 MacInnis et al.
6,023,464 A 2/2000 Woundy
6,023,725 A 2/2000 Ozawa et al.
6,025,870 A 2/2000 Hardy
6,026,166 A 2/2000 LeBourgeois
6,028,960 A 2/2000 Graf et al.
6,029,151 A 2/2000 Nikander
6,032,036 A 2/2000 Maystre et al.
6,038,465 A 3/2000 Melton, Jr.
6,040,783 A 3/2000 Houvener et al.
6,040,829 A 3/2000 Croy et al.
6,047,261 A 4/2000 Siefert
6,052,123 A 4/2000 Lection et al.
6,052,145 A 4/2000 Macrae et al.
6,055,560 A 4/2000 Mills et al.
6,064,980 A 5/2000 Jacobi et al.
6,067,545 A 5/2000 Wolff
6,067,623 A 5/2000 Blakley, III et al.
6,073,242 A 6/2000 Hardy et al.
6,091,771 A 7/2000 Seeley et al.
6,092,196 A 7/2000 Reiche
6,094,156 A 7/2000 Henty
6,094,681 A 7/2000 Shaffer et al.
6,101,481 A 8/2000 Miller
6,101,483 A 8/2000 Petrovich et al.
6,104,334 A 8/2000 Allport
6,108,691 A 8/2000 Lee et al.
6,111,893 A 8/2000 Volftsun et al.
6,118,493 A 9/2000 Duhault et al.
6,119,172 A 9/2000 Belmont et al.
6,122,258 A 9/2000 Brown
6,125,115 A 9/2000 Smits
6,128,484 A 10/2000 Singkornrat et al.
6,130,726 A 10/2000 Darbee et al.
6,130,898 A 10/2000 Kostreski et al.
6,134,345 A 10/2000 Berman et al.
6,134,532 A 10/2000 Lazarus et al.
6,138,245 A 10/2000 Son et al.
6,141,062 A 10/2000 Hall et al.
6,141,665 A 10/2000 Hara et al.
6,144,959 A 11/2000 Anderson et al.
6,144,961 A 11/2000 de la Salle
6,147,695 A 11/2000 Bowen et al.
6,147,717 A 11/2000 Jun
6,157,319 A 12/2000 Johns et al.
6,161,124 A 12/2000 Takagawa et al.
6,166,744 A 12/2000 Jaszlics et al.
6,168,563 B1 1/2001 Brown
6,169,497 B1 1/2001 Robert
6,169,842 B1 1/2001 Pijnenburg et al.
6,170,065 B1 1/2001 Kobata et al.
6,172,640 B1 1/2001 Durst et al.
6,188,400 B1 2/2001 House et al.
6,188,985 B1 2/2001 Thrift et al.
6,192,118 B1 2/2001 Bayless et al.
6,195,797 B1 2/2001 Williams, Jr.
6,198,751 B1 3/2001 Dorsey et al.
6,201,580 B1 3/2001 Voltz et al.
6,204,887 B1 3/2001 Hiroi
6,205,437 B1 3/2001 Gifford
6,205,466 B1 3/2001 Karp et al.
6,208,379 B1 3/2001 Oya et al.
6,209,025 B1 3/2001 Bellamy
6,212,559 B1 4/2001 Bixler et al.
6,212,564 B1 4/2001 Harter et al.
6,219,639 B1 4/2001 Bakis et al.
6,219,695 B1 4/2001 Guttag et al.
6,223,202 B1 4/2001 Bayeh
6,233,318 B1 5/2001 Picard et al.
6,233,560 B1 5/2001 Tannenbaum
6,239,700 B1 5/2001 Hoffman et al.
6,240,360 B1 5/2001 Phelan
6,240,454 B1 5/2001 Nepustil
6,240,555 B1 5/2001 Shoff et al.
6,243,039 B1 6/2001 Elliot

(56) References Cited

U.S. PATENT DOCUMENTS 6,243,772 B1 6/2001 Ghori et al.
6,243,816 B1 6/2001 Fan et al.
6,248,065 B1 6/2001 Brown
6,253,327 B1 6/2001 Zhang et al.
6,256,389 B1 7/2001 Dalrymple et al.
6,256,739 B1 7/2001 Skopp et al.
6,259,443 B1 7/2001 Williams, Jr.
6,263,368 B1 7/2001 Martin
6,269,107 B1 7/2001 Jong
6,269,355 B1 7/2001 Grimse et al.
6,269,369 B1 7/2001 Robertson
6,273,622 B1 8/2001 Ben-David
6,277,071 B1 8/2001 Hennessy et al.
6,286,038 B1 9/2001 Reichmeyer et al.
6,286,142 B1 9/2001 Ehreth
6,289,340 B1 9/2001 Puram et al.
6,292,769 B1 9/2001 Flanagan et al.
6,292,901 B1 9/2001 Lys et al.
6,314,475 B1 11/2001 Collin et al.
6,314,575 B1 11/2001 Billock et al.
6,317,885 B1 11/2001 Fries
6,321,339 B1 11/2001 French et al.
6,324,538 B1 11/2001 Wesinger, Jr. et al.
6,327,004 B1 12/2001 Miyabayashi et al.
6,330,022 B1 12/2001 Seligmann
6,330,597 B2 12/2001 Collin et al.
6,332,193 B1 12/2001 Glass et al.
6,343,287 B1 1/2002 Kumar et al.
6,344,817 B1 2/2002 Verzulli
6,345,051 B1 2/2002 Gupta et al.
6,356,863 B1 3/2002 Sayle
6,359,557 B2 3/2002 Bilder
6,359,657 B1 3/2002 Westerink et al.
6,360,222 B1 3/2002 Quinn
6,362,778 B2 3/2002 Neher
6,364,314 B1 4/2002 Canterbury
6,370,355 B1 4/2002 Ceretta et al.
6,370,510 B1 4/2002 McGovern et al.
6,370,543 B2 4/2002 Hoffert et al.
6,373,389 B1 4/2002 Przygoda, Jr. et al.
6,377,861 B1 4/2002 York
6,381,592 B1 4/2002 Reuning
6,381,746 B1 4/2002 Urry
6,381,748 B1 4/2002 Lin et al.
6,385,772 B1 5/2002 Courtney
6,389,593 B1 5/2002 Yamagishi
6,392,664 B1 5/2002 White et al.
6,393,460 B1 5/2002 Gruen et al.
6,396,531 B1 5/2002 Gerszberg et al.
6,396,535 B1 5/2002 Waters
6,397,186 B1 5/2002 Bush et al.
6,401,211 B1 6/2002 Brezak, Jr. et al.
6,405,245 B1 6/2002 Burson et al.
6,405,252 B1 6/2002 Gupta et al.
6,407,779 B1 6/2002 Herz
6,411,744 B1 6/2002 Edwards
6,412,025 B1 6/2002 Cheston et al.
6,416,471 B1 7/2002 Kumar et al.
6,421,359 B1 7/2002 Bennett et al.
6,424,249 B1 7/2002 Houvener
6,424,370 B1 7/2002 Courtney
6,425,128 B1 7/2002 Krapf et al.
6,430,604 B1 8/2002 Ogle et al.
6,430,740 B1 8/2002 Hart et al.
6,434,747 B1 8/2002 Khoo et al.
6,437,834 B1 8/2002 Tagami
6,438,216 B1 8/2002 Aktas
6,438,618 B1 8/2002 Lortz et al.
6,442,542 B1 8/2002 Ramani et al.
6,442,567 B1 8/2002 Retallick et al.
6,442,598 B1 8/2002 Wright et al.
6,449,632 B1 9/2002 David et al.
6,453,392 B1 9/2002 Flynn, Jr.
6,457,010 B1 9/2002 Eldering et al.
6,459,427 B1 10/2002 Mao et al.
6,459,913 B2 10/2002 Cloutier
6,460,040 B1 10/2002 Burns
6,463,465 B1 10/2002 Nieuwejaar
6,463,585 B1 10/2002 Hendricks et al.
6,466,232 B1 10/2002 Newell et al.
6,466,654 B1 10/2002 Cooper et al.
6,469,746 B1 10/2002 Maida
6,473,692 B2 10/2002 Hancock et al.
6,473,788 B1 10/2002 Kim et al.
6,475,090 B2 11/2002 Roelofs
6,481,012 B1 11/2002 Gordon et al.
6,483,523 B1 11/2002 Feng
6,487,584 B1 11/2002 Bunney
6,490,617 B1 12/2002 Hemphill et al.
6,496,803 B1 12/2002 Seet et al.
6,496,857 B1 12/2002 Dustin et al.
6,496,981 B1 12/2002 Wistendahl et al.
6,498,920 B1 12/2002 Simon
6,501,441 B1 12/2002 Ludtke et al.
6,504,580 B1 1/2003 Thompson et al.
6,505,243 B1 1/2003 Lortz
6,507,306 B1 1/2003 Griesau et al.
6,507,845 B1 1/2003 Cohen et al.
6,507,951 B1 1/2003 Wugofski
6,510,152 B1 1/2003 Gerszberg et al.
6,510,466 B1 1/2003 Cox et al.
6,516,338 B1 2/2003 Landsman et al.
6,516,350 B1 2/2003 Lumelsky et al.
6,522,352 B1 2/2003 Strandwitz et al.
6,522,787 B1 2/2003 Kumar et al.
6,526,351 B2 2/2003 Whitham
6,526,442 B1 2/2003 Stupek, Jr. et al.
6,529,885 B1 3/2003 Johnson
6,529,936 B1 3/2003 Mayo et al.
6,530,084 B1 3/2003 Del Sesto et al.
6,532,218 B1 3/2003 Shaffer et al.
6,532,589 B1 3/2003 Proehl et al.
6,539,099 B1 3/2003 Kellner
6,539,379 B1 3/2003 Vora et al.
6,539,418 B2 3/2003 Schneider et al.
6,539,545 B1 3/2003 Dureau et al.
6,542,191 B1 4/2003 Yonezawa
6,546,004 B2 4/2003 Gullicksen
6,546,554 B1 4/2003 Schmidt et al.
6,549,768 B1 4/2003 Fraccaroli
6,553,178 B2 4/2003 Abecassis
6,553,336 B1 4/2003 Johnson et al.
6,556,241 B1 4/2003 Yoshimura et al.
6,556,253 B1 4/2003 Megied et al.
6,556,820 B1 4/2003 Le et al.
6,556,995 B1 4/2003 Child et al.
6,558,049 B1 5/2003 Shin
6,560,648 B1 5/2003 Dunn et al.
6,564,243 B1 5/2003 Yedidia et al.
6,564,246 B1 5/2003 Varma et al.
6,564,261 B1 5/2003 Gudjonsson et al.
6,564,264 B1 5/2003 Creswell et al.
6,564,320 B1 5/2003 de Silva et al.
6,564,380 B1 5/2003 Murphy
6,567,086 B1 5/2003 Hashimoto
6,567,980 B1 5/2003 Jain et al.
6,567,984 B1 5/2003 Allport
6,571,271 B1 5/2003 Savitzky et al.
6,573,905 B1 6/2003 MacInnis et al.
6,574,620 B2 6/2003 Borovoy et al.
6,577,712 B2 6/2003 Larsson et al.
6,577,714 B1 6/2003 Darcie et al.
6,578,199 B1 6/2003 Tsou et al.
6,584,076 B1 6/2003 Aravamudan et al.
6,587,125 B1 7/2003 Paroz
6,587,832 B1 7/2003 Beck et al.
6,590,604 B1 7/2003 Tucker et al.
6,591,247 B2 7/2003 Stern
6,591,279 B1 7/2003 Emens et al.
6,594,260 B1 7/2003 Aviani, Jr. et al.
6,594,354 B1 7/2003 Kelly
6,601,098 B1 7/2003 Case et al.
6,603,502 B2 8/2003 Martin et al.
6,603,845 B2 8/2003 Jensen et al.

(56) References Cited

U.S. PATENT DOCUMENTS 6,606,117 B1 8/2003 Windle
6,606,644 B1 8/2003 Ford et al.
6,606,647 B2 8/2003 Shah et al.
6,609,213 B1 8/2003 Nguyen et al.
6,611,842 B1 8/2003 Brown
6,615,276 B1 9/2003 Mastrianni et al.
6,616,613 B1 9/2003 Goodman
6,617,969 B2 9/2003 Tu et al.
6,622,160 B1 9/2003 Horvitz
6,628,194 B1 9/2003 Hellebust et al.
6,628,304 B2 9/2003 Mitchell et al.
6,628,835 B1 9/2003 Brill et al.
6,629,077 B1 9/2003 Arling et al.
6,629,129 B1 9/2003 Bookspan et al.
6,629,246 B1 9/2003 Gadi
6,633,281 B2 10/2003 Lin et al.
6,636,259 B1 10/2003 Anderson et al.
6,637,029 B1 10/2003 Maissel et al.
6,640,145 B2 10/2003 Hoffberg et al.
6,640,187 B1 10/2003 Chenault et al.
6,640,241 B1 10/2003 Ozzie et al.
6,640,278 B1 10/2003 Nolan et al.
6,643,782 B1 11/2003 Jin et al.
6,650,248 B1 11/2003 O'Donnell et al.
6,651,086 B1 11/2003 Manber et al.
6,657,661 B1 12/2003 Cazier
6,658,095 B1 12/2003 Yoakum et al.
6,662,194 B1 12/2003 Joao
6,662,223 B1 12/2003 Zhang et al.
6,664,956 B1 12/2003 Erdem
6,665,004 B1 12/2003 Paff
6,665,714 B1 12/2003 Blumenau et al.
6,665,725 B1 12/2003 Dietz et al.
6,674,403 B2 1/2004 Gray et al.
6,675,168 B2 1/2004 Shapiro et al.
6,677,968 B1 1/2004 Appelman
6,677,976 B2 1/2004 Parker et al.
6,678,004 B1 1/2004 Schultheiss et al.
6,678,719 B1 1/2004 Stimmel
6,678,827 B1 1/2004 Rothermel et al.
6,680,754 B1 1/2004 Yim
6,681,232 B1 1/2004 Sistanizadeh et al.
6,681,323 B1 1/2004 Fontanesi et al.
6,683,623 B1 1/2004 Cassano et al.
RE38,432 E 2/2004 Fai et al.
6,685,090 B2 2/2004 Nishigaya et al.
6,685,633 B2 2/2004 Albert et al.
6,687,485 B2 2/2004 Hopkins et al.
6,687,634 B2 2/2004 Borg
6,688,888 B1 2/2004 Ho et al.
6,690,654 B2 2/2004 Elliott et al.
6,690,773 B1 2/2004 Law
6,691,154 B1 2/2004 Zhu et al.
6,691,158 B1 2/2004 Douvikas et al.
6,694,375 B1 2/2004 Beddus et al.
6,697,810 B2 2/2004 Kumar et al.
6,697,837 B1 2/2004 Rodov
6,697,840 B1 2/2004 Godefroid et al.
6,697,947 B1 2/2004 Matyas, Jr. et al.
6,698,020 B1 2/2004 Zigmond et al.
6,698,021 B1 2/2004 Amini et al.
6,700,493 B1 3/2004 Robinson
6,700,967 B2 3/2004 Kleinoder et al.
6,701,143 B1 3/2004 Dukach et al.
6,701,348 B2 3/2004 Sommerer
6,701,358 B1 3/2004 Poisson et al.
6,704,460 B1 3/2004 Pitruzzello et al.
6,704,930 B1 3/2004 Eldering et al.
6,705,991 B2 3/2004 Bardy
6,711,630 B2 3/2004 Dubal et al.
6,714,944 B1 3/2004 Shapiro et al.
6,714,967 B1 3/2004 Horvitz
6,718,372 B1 4/2004 Bober
6,718,551 B1 4/2004 Swix et al.
6,720,976 B1 4/2004 Shimizu et al.
6,725,269 B1 4/2004 Megiddo
6,727,960 B2 4/2004 Seo
6,732,101 B1 5/2004 Cook
6,732,172 B1 5/2004 House et al.
6,732,176 B1 5/2004 Stewart et al.
6,735,630 B1 5/2004 Gelvin et al.
6,738,462 B1 5/2004 Brunson
6,738,808 B1 5/2004 Zellner et al.
6,741,586 B1 5/2004 Schuster et al.
6,741,864 B2 5/2004 Wilcock et al.
6,742,099 B1 5/2004 Mendoza et al.
6,742,184 B1 5/2004 Finseth et al.
6,745,207 B2 6/2004 Reuter et al.
6,747,562 B2 6/2004 Giraldin et al.
6,747,692 B2 6/2004 Patel et al.
6,749,566 B2 6/2004 Russ
6,750,880 B2 6/2004 Freiberger et al.
6,750,896 B2 6/2004 McClure
6,751,297 B2 6/2004 Nelkenbaum
6,753,929 B1 6/2004 Sheraizin et al.
6,754,233 B1 6/2004 Henderson et al.
6,754,373 B1 6/2004 de Cuetos et al.
6,754,699 B2 6/2004 Swildens et al.
6,754,855 B1 6/2004 Denninghoff et al.
6,757,008 B1 6/2004 Smith
6,757,255 B1 6/2004 Aoki et al.
6,757,720 B1 6/2004 Weschler, Jr.
6,757,723 B1 6/2004 O'Toole et al.
6,757,833 B2 6/2004 Wakai et al.
6,760,638 B1 7/2004 Love et al.
6,760,749 B1 7/2004 Dunlap et al.
6,760,916 B2 7/2004 Holtz et al.
6,763,384 B1 7/2004 Gupta et al.
6,763,395 B1 7/2004 Austin
6,772,216 B1 8/2004 Ankireddipally et al.
6,772,435 B1 8/2004 Thexton et al.
6,773,344 B1 8/2004 Gabai et al.
6,774,797 B2 8/2004 Freathy et al.
6,774,926 B1 8/2004 Ellis et al.
6,775,371 B2 8/2004 Elsey et al.
6,778,068 B2 8/2004 Wolfe
6,782,385 B2 8/2004 Natsumeda et al.
6,785,686 B2 8/2004 Boreham et al.
6,785,834 B2 8/2004 Chefalas et al.
RE38,598 E 9/2004 Frese, II et al.
6,788,696 B2 9/2004 Allan et al.
6,788,769 B1 9/2004 Waites
6,789,047 B1 9/2004 Woodson
6,791,580 B1 9/2004 Abbott et al.
6,792,395 B2 9/2004 Roberts
6,792,615 B1 9/2004 Rowe et al.
6,795,798 B2 9/2004 Eryurek et al.
6,795,967 B1 9/2004 Evans et al.
6,798,753 B1 9/2004 Doganata et al.
6,798,897 B1 9/2004 Rosenberg
6,799,195 B1 9/2004 Thibault et al.
6,799,209 B1 9/2004 Hayton
6,801,818 B2 10/2004 Kopcha
6,801,878 B1 10/2004 Hintz et al.
6,801,940 B1 10/2004 Moran et al.
6,801,946 B1 10/2004 Child et al.
6,803,912 B1 10/2004 Mark et al.
6,803,968 B1 10/2004 Numata
6,804,675 B1 10/2004 Knight et al.
6,804,707 B1 10/2004 Ronning
6,807,232 B2 10/2004 Nicholson et al.
6,807,423 B1 10/2004 Armstrong et al.
6,810,367 B2 10/2004 Barnard
6,813,248 B1 11/2004 Boss et al.
6,813,639 B2 11/2004 Nobakht et al.
6,816,878 B1 11/2004 Zimmers et al.
6,816,904 B1 11/2004 Ludwig et al.
6,819,919 B1 11/2004 Tanaka
6,820,055 B2 11/2004 Saindon et al.
6,820,277 B1 11/2004 Eldering et al.
6,823,047 B1 11/2004 Cruickshank
6,823,385 B2 11/2004 McKinnon, III et al.
6,823,526 B2 11/2004 Howard et al.
6,825,761 B2 11/2004 Christ et al.

(56) References Cited

U.S. PATENT DOCUMENTS

| | | | |
|---|---|---|---|
| 6,825,767 | B2 | 11/2004 | Humbard |
| 6,826,512 | B2 | 11/2004 | Dara-Abrams et al. |
| 6,826,696 | B1 | 11/2004 | Chawla et al. |
| 6,829,015 | B2 | 12/2004 | Kwon |
| 6,829,348 | B1 | 12/2004 | Schroeder et al. |
| 6,829,639 | B1 | 12/2004 | Lawson et al. |
| 6,832,377 | B1 | 12/2004 | Havemose |
| 6,833,865 | B1 | 12/2004 | Fuller et al. |
| 6,834,112 | B1 | 12/2004 | Brickell |
| 6,834,274 | B2 | 12/2004 | Tafoya |
| 6,834,374 | B1 | 12/2004 | Sameshima |
| 6,836,286 | B1 | 12/2004 | Tachi et al. |
| 6,836,657 | B2 | 12/2004 | Ji et al. |
| 6,836,667 | B1 | 12/2004 | Smith, Jr. |
| 6,839,565 | B2 | 1/2005 | Sarkkinen et al. |
| 6,839,735 | B2 | 1/2005 | Wong et al. |
| 6,842,505 | B1 | 1/2005 | Suder et al. |
| 6,842,774 | B1 | 1/2005 | Piccioni |
| 6,842,777 | B1 | 1/2005 | Tuli |
| 6,847,892 | B2 | 1/2005 | Zhou et al. |
| 6,847,940 | B1 | 1/2005 | Shelton et al. |
| 6,850,496 | B1 | 2/2005 | Knappe et al. |
| 6,850,603 | B1 | 2/2005 | Eberle et al. |
| 6,850,609 | B1 | 2/2005 | Schrage |
| 6,850,892 | B1 | 2/2005 | Shaw |
| 6,850,900 | B1 | 2/2005 | Hare et al. |
| 6,850,901 | B1 | 2/2005 | Hunter et al. |
| 6,850,924 | B2 | 2/2005 | Grimse et al. |
| 6,853,385 | B1 | 2/2005 | MacInnis et al. |
| 6,853,398 | B2 | 2/2005 | Malzbender et al. |
| 6,854,056 | B1 | 2/2005 | Benantar et al. |
| 6,857,013 | B2 | 2/2005 | Ramberg et al. |
| 6,859,827 | B2 | 2/2005 | Banginwar |
| 6,860,897 | B2 | 3/2005 | Bardy |
| 6,862,585 | B2 | 3/2005 | Planalp et al. |
| 6,862,622 | B2 | 3/2005 | Jorgensen |
| 6,865,370 | B2 | 3/2005 | Ho et al. |
| 6,865,691 | B1 | 3/2005 | Brundridge et al. |
| 6,868,452 | B1 | 3/2005 | Eager et al. |
| 6,871,195 | B2 | 3/2005 | Ryan et al. |
| 6,871,220 | B1 | 3/2005 | Rajan et al. |
| 6,871,224 | B1 | 3/2005 | Chu et al. |
| 6,879,702 | B1 | 4/2005 | Fisher et al. |
| 6,883,000 | B1 | 4/2005 | Gropper |
| 6,886,178 | B1 | 4/2005 | Mao et al. |
| 6,889,207 | B2 | 5/2005 | Slemmer et al. |
| 6,889,213 | B1 | 5/2005 | Douvikas et al. |
| 6,889,382 | B1 | 5/2005 | Anderson |
| 6,889,385 | B1 | 5/2005 | Rakib et al. |
| 6,893,397 | B2 | 5/2005 | Bardy |
| 6,895,558 | B1 | 5/2005 | Loveland |
| 6,898,645 | B2 | 5/2005 | Abujbara |
| 6,898,733 | B2 | 5/2005 | Parks et al. |
| 6,901,439 | B1 | 5/2005 | Bonasia et al. |
| 6,904,407 | B2 | 6/2005 | Ritzel |
| 6,904,416 | B2 | 6/2005 | Nassiri |
| 6,909,378 | B1 | 6/2005 | Lambrechts et al. |
| 6,909,457 | B1 | 6/2005 | Fukasawa |
| 6,910,135 | B1 | 6/2005 | Grainger |
| 6,912,313 | B2 | 6/2005 | Li |
| 6,914,551 | B2 | 7/2005 | Vidal |
| 6,914,626 | B2 | 7/2005 | Squibbs |
| 6,914,893 | B2 | 7/2005 | Petite |
| 6,917,566 | B2 | 7/2005 | Griner et al. |
| 6,919,892 | B1 | 7/2005 | Cheiky et al. |
| 6,922,672 | B1 | 7/2005 | Hailpern et al. |
| 6,925,438 | B2 | 8/2005 | Mohamed et al. |
| 6,928,464 | B2 | 8/2005 | Appiah et al. |
| 6,928,546 | B1 | 8/2005 | Nanavati et al. |
| 6,931,376 | B2 | 8/2005 | Lipe et al. |
| 6,931,596 | B2 | 8/2005 | Gutta et al. |
| 6,933,955 | B2 | 8/2005 | Crocitii et al. |
| 6,934,880 | B2 | 8/2005 | Hofner |
| 6,937,699 | B1 | 8/2005 | Schuster et al. |
| 6,937,755 | B2 | 8/2005 | Orpaz et al. |
| 6,937,842 | B2 | 8/2005 | Uchimura et al. |
| 6,937,984 | B1 | 8/2005 | Morgan et al. |
| 6,938,069 | B1 | 8/2005 | Narayanaswamy |
| 6,938,076 | B2 | 8/2005 | Meyer et al. |
| 6,938,101 | B2 | 8/2005 | Hayes et al. |
| 6,940,545 | B1 | 9/2005 | Ray et al. |
| 6,940,958 | B2 | 9/2005 | Clapper |
| 6,941,386 | B2 | 9/2005 | Craft et al. |
| 6,941,575 | B2 | 9/2005 | Allen |
| 6,944,668 | B1 | 9/2005 | Broquist et al. |
| 6,944,677 | B1 | 9/2005 | Zhao |
| 6,954,799 | B2 | 10/2005 | Lerner |
| 6,957,337 | B1 | 10/2005 | Chainer et al. |
| 6,961,763 | B1 | 11/2005 | Wang et al. |
| 6,963,879 | B2 | 11/2005 | Colver et al. |
| 6,965,593 | B2 | 11/2005 | Donahue et al. |
| 6,965,917 | B1 | 11/2005 | Aloni et al. |
| 6,966,004 | B1 | 11/2005 | Jin et al. |
| 6,968,179 | B1 | 11/2005 | De Vries |
| 6,968,312 | B1 | 11/2005 | Jordan et al. |
| 6,968,441 | B1 | 11/2005 | Schnee |
| 6,968,569 | B2 | 11/2005 | Tanaka et al. |
| 6,970,183 | B1 | 11/2005 | Monroe |
| 6,970,547 | B2 | 11/2005 | Andrewss et al. |
| 6,970,641 | B1 | 11/2005 | Pierre et al. |
| 6,970,873 | B2 | 11/2005 | Fu et al. |
| 6,973,035 | B2 | 12/2005 | Seddigh et al. |
| 6,973,489 | B1 | 12/2005 | Levy |
| 6,973,621 | B2 | 12/2005 | Sie et al. |
| 6,975,308 | B1 | 12/2005 | Bitetto et al. |
| 6,975,324 | B1 | 12/2005 | Valmiki et al. |
| 6,975,346 | B2 | 12/2005 | Kumhyr |
| 6,975,970 | B2 | 12/2005 | Thorisson |
| 6,976,164 | B1 | 12/2005 | King et al. |
| 6,978,369 | B2 | 12/2005 | Wheeler et al. |
| 6,980,232 | B2 | 12/2005 | Suzuki |
| 6,980,966 | B1 | 12/2005 | Sobrado et al. |
| 6,980,993 | B2 | 12/2005 | Horvitz et al. |
| 6,981,043 | B2 | 12/2005 | Botz et al. |
| 6,982,656 | B1 | 1/2006 | Coppinger et al. |
| 6,982,978 | B1 | 1/2006 | Zhang et al. |
| 6,983,282 | B2 | 1/2006 | Stern et al. |
| 6,985,078 | B2 | 1/2006 | Suzuki et al. |
| 6,985,872 | B2 | 1/2006 | Benbassat et al. |
| 6,985,961 | B1 | 1/2006 | Ramsayer et al. |
| 6,987,841 | B1 | 1/2006 | Byers et al. |
| 6,988,277 | B2 | 1/2006 | Kovac et al. |
| 6,989,763 | B2 | 1/2006 | Wall et al. |
| 6,989,856 | B2 | 1/2006 | Firestone et al. |
| 6,990,495 | B1 | 1/2006 | Grason et al. |
| 6,996,406 | B2 | 2/2006 | Lection et al. |
| 6,996,408 | B2 | 2/2006 | Blossom et al. |
| 6,996,718 | B1 | 2/2006 | Henry et al. |
| 6,997,803 | B2 | 2/2006 | LeMay et al. |
| 7,000,007 | B1 | 2/2006 | Valenti |
| 7,000,245 | B1 | 2/2006 | Pierre et al. |
| 7,002,602 | B2 | 2/2006 | MacInnis et al. |
| 7,003,517 | B1 | 2/2006 | Seibel et al. |
| 7,003,525 | B1 | 2/2006 | Horvitz et al. |
| 7,003,789 | B1 | 2/2006 | Linehan |
| 7,006,102 | B2 | 2/2006 | Rowe |
| 7,006,881 | B1 | 2/2006 | Hoffberg et al. |
| 7,006,989 | B2 | 2/2006 | Bezos et al. |
| 7,007,068 | B2 | 2/2006 | Morkel |
| 7,015,817 | B2 | 3/2006 | Copley et al. |
| 7,015,875 | B2 | 3/2006 | Wampler et al. |
| 7,015,951 | B1 | 3/2006 | Yoshigahara et al. |
| 7,016,888 | B2 | 3/2006 | Slemmer et al. |
| 7,019,788 | B2 | 3/2006 | Iizuka et al. |
| 7,020,262 | B2 | 3/2006 | Kredo et al. |
| 7,020,598 | B1 | 3/2006 | Jacobson |
| 7,020,686 | B2 | 3/2006 | Banatwala |
| 7,023,468 | B2 | 4/2006 | Chikahisa et al. |
| 7,023,490 | B2 | 4/2006 | Konuma |
| 7,024,471 | B2 | 4/2006 | George et al. |
| 7,024,678 | B2 | 4/2006 | Gordon et al. |
| 7,027,054 | B1 | 4/2006 | Cheiky et al. |
| 7,027,460 | B2 | 4/2006 | Iyer et al. |
| 7,027,586 | B2 | 4/2006 | Bushey et al. |

(56) References Cited

U.S. PATENT DOCUMENTS

| | | | |
|---|---|---|---|
| 7,027,659 B1 | 4/2006 | Thomas | |
| 7,028,034 B2 | 4/2006 | Wesinger, Jr. et al. | |
| 7,028,074 B2 | 4/2006 | Ye et al. | |
| 7,028,103 B2 | 4/2006 | Martinez et al. | |
| 7,030,932 B2 | 4/2006 | Han | |
| 7,039,698 B2 | 5/2006 | Slemmer et al. | |
| 7,039,714 B1 | 5/2006 | Blakley, III et al. | |
| 7,043,531 B1 | 5/2006 | Seibel et al. | |
| 7,043,695 B2 | 5/2006 | Elber et al. | |
| 7,050,112 B2 | 5/2006 | Rieder et al. | |
| 7,050,792 B2 | 5/2006 | Chou et al. | |
| 7,054,837 B2 | 5/2006 | Hoffman et al. | |
| 7,054,886 B2 | 5/2006 | Stern et al. | |
| 7,055,011 B2 | 5/2006 | Iwamura et al. | |
| 7,062,563 B1 | 6/2006 | Lewis et al. | |
| 7,062,717 B2 | 6/2006 | Scott | |
| 7,064,652 B2 | 6/2006 | Junqua et al. | |
| 7,065,185 B1 | 6/2006 | Koch | |
| 7,065,777 B2 | 6/2006 | Inoue | |
| 7,068,275 B2 | 6/2006 | Nakamura et al. | |
| 7,068,769 B1 | 6/2006 | Weaver et al. | |
| 7,069,238 B2 | 6/2006 | I'Anson et al. | |
| 7,069,242 B1 | 6/2006 | Sheth et al. | |
| 7,069,309 B1 | 6/2006 | Dodrill et al. | |
| 7,069,579 B2 | 6/2006 | Delpuch | |
| 7,070,562 B2 | 7/2006 | Bardy | |
| 7,071,944 B2 | 7/2006 | MacInnis et al. | |
| 7,072,843 B2 | 7/2006 | Menninger et al. | |
| 7,075,541 B2 | 7/2006 | Diard | |
| 7,075,919 B1 | 7/2006 | Wendt et al. | |
| 7,076,255 B2 | 7/2006 | Parupudi et al. | |
| 7,076,797 B2 | 7/2006 | Loveland | |
| 7,079,007 B2 | 7/2006 | Siegel et al. | |
| 7,079,195 B1 | 7/2006 | Birleson et al. | |
| 7,079,652 B1 | 7/2006 | Harris | |
| 7,079,707 B2 | 7/2006 | Baron | |
| 7,080,070 B1 | 7/2006 | Gavarini | |
| 7,080,404 B2 | 7/2006 | Abdo et al. | |
| 7,084,775 B1 | 8/2006 | Smith | |
| 7,084,780 B2 | 8/2006 | Nguyen et al. | |
| 7,084,876 B1 * | 8/2006 | Fogel et al. | 345/473 |
| 7,085,320 B2 | 8/2006 | Ouyang et al. | |
| 7,085,679 B2 | 8/2006 | Dobell et al. | |
| 7,085,834 B2 | 8/2006 | Delany et al. | |
| 7,086,061 B1 | 8/2006 | Joshi et al. | |
| 7,086,080 B2 | 8/2006 | Martinez et al. | |
| 7,088,801 B1 | 8/2006 | Gross et al. | |
| 7,091,852 B2 | 8/2006 | Mason et al. | |
| 7,091,993 B1 | 8/2006 | Ahmad | |
| 7,093,019 B1 | 8/2006 | Bertani et al. | |
| 7,093,169 B2 | 8/2006 | Merriam | |
| 7,095,321 B2 | 8/2006 | Primm et al. | |
| 7,095,456 B2 | 8/2006 | Nakajima | |
| 7,096,220 B1 | 8/2006 | Seibel et al. | |
| 7,096,232 B2 | 8/2006 | Doss et al. | |
| 7,096,482 B2 | 8/2006 | Fujita et al. | |
| 7,098,870 B2 | 8/2006 | Wampler et al. | |
| 7,100,116 B1 | 8/2006 | Shafrir et al. | |
| 7,102,647 B2 | 9/2006 | Sloan et al. | |
| 7,102,691 B2 | 9/2006 | Dischert et al. | |
| 7,103,165 B2 | 9/2006 | Baniak et al. | |
| 7,103,511 B2 | 9/2006 | Petite | |
| 7,103,578 B2 | 9/2006 | Beck et al. | |
| 7,103,904 B1 | 9/2006 | Blackketter et al. | |
| 7,106,374 B1 | 9/2006 | Bandera et al. | |
| 7,106,756 B1 | 9/2006 | Donovan et al. | |
| 7,109,846 B2 | 9/2006 | Ljunggren et al. | |
| 7,109,908 B2 | 9/2006 | Griesau et al. | |
| 7,110,006 B2 | 9/2006 | MacInnis et al. | |
| 7,110,602 B2 | 9/2006 | Krause | |
| 7,110,750 B2 | 9/2006 | Oishi et al. | |
| 7,111,054 B2 | 9/2006 | Lo | |
| 7,111,061 B2 | 9/2006 | Leighton et al. | |
| 7,111,314 B2 | 9/2006 | Urdang et al. | |
| 7,113,618 B2 | 9/2006 | Junkins et al. | |
| 7,114,079 B1 | 9/2006 | Cook et al. | |
| 7,114,167 B2 | 9/2006 | Slemmer et al. | |
| 7,116,376 B2 | 10/2006 | Yun | |
| 7,117,028 B2 | 10/2006 | Bardy | |
| 7,117,246 B2 | 10/2006 | Christenson et al. | |
| 7,117,434 B2 | 10/2006 | Novaes | |
| 7,120,672 B1 | 10/2006 | Szeto et al. | |
| 7,120,694 B2 | 10/2006 | Sinha | |
| 7,123,694 B1 | 10/2006 | Hecker | |
| 7,124,191 B2 | 10/2006 | McIntyre | |
| 7,127,303 B2 | 10/2006 | Renner | |
| 7,127,464 B2 | 10/2006 | Wesinger, Jr. et al. | |
| 7,133,834 B1 | 11/2006 | Abelow | |
| 7,133,869 B2 | 11/2006 | Bryan et al. | |
| 7,133,900 B1 | 11/2006 | Szeto | |
| 7,133,905 B2 | 11/2006 | Dilley et al. | |
| 7,134,080 B2 | 11/2006 | Kjeldsen et al. | |
| 7,136,631 B1 | 11/2006 | Jiang et al. | |
| 7,137,006 B1 | 11/2006 | Grandcolas et al. | |
| 7,137,141 B1 | 11/2006 | McClanahan | |
| 7,139,797 B1 | 11/2006 | Yoakum et al. | |
| 7,142,663 B2 | 11/2006 | Nimri et al. | |
| 7,143,095 B2 | 11/2006 | Barrett et al. | |
| 7,143,118 B2 | 11/2006 | Eichstaedt et al. | |
| 7,143,155 B1 | 11/2006 | Reed et al. | |
| 7,143,356 B1 | 11/2006 | Shafrir et al. | |
| 7,146,627 B1 | 12/2006 | Ismail et al. | |
| 7,148,796 B2 | 12/2006 | Joy et al. | |
| 7,149,698 B2 | 12/2006 | Guheen et al. | |
| 7,149,703 B2 | 12/2006 | Younger | |
| 7,149,743 B2 | 12/2006 | Colwill, Jr. | |
| 7,151,438 B1 | 12/2006 | Hall et al. | |
| 7,154,533 B2 | 12/2006 | Sheldon et al. | |
| 7,154,558 B2 | 12/2006 | Yui et al. | |
| 7,155,674 B2 | 12/2006 | Breen et al. | |
| 7,158,147 B2 | 1/2007 | Watson et al. | |
| 7,158,977 B2 | 1/2007 | Challener et al. | |
| 7,162,241 B2 | 1/2007 | Kim et al. | |
| 7,162,474 B1 | 1/2007 | Harker et al. | |
| 7,162,508 B2 | 1/2007 | Messina | |
| 7,165,039 B2 | 1/2007 | Seet et al. | |
| 7,165,044 B1 | 1/2007 | Chaffee | |
| 7,165,122 B1 | 1/2007 | Sitaraman et al. | |
| 7,167,895 B1 | 1/2007 | Connelly | |
| 7,171,025 B2 | 1/2007 | Rui et al. | |
| 7,171,369 B1 | 1/2007 | Bertram et al. | |
| 7,171,448 B1 | 1/2007 | Danielsen et al. | |
| 7,174,339 B1 | 2/2007 | Wucherer et al. | |
| 7,177,406 B2 | 2/2007 | Caputo et al. | |
| 7,177,658 B2 | 2/2007 | Willenegger et al. | |
| 7,180,415 B2 | 2/2007 | Bankert et al. | |
| 7,181,228 B2 | 2/2007 | Boesch | |
| 7,181,472 B2 | 2/2007 | Cameron et al. | |
| 7,184,960 B2 | 2/2007 | Deisher et al. | |
| 7,185,352 B2 | 2/2007 | Hallford et al. | |
| 7,187,986 B2 | 3/2007 | Johnson et al. | |
| 7,188,094 B2 | 3/2007 | Excoffier et al. | |
| 7,188,181 B1 | 3/2007 | Squier et al. | |
| 7,188,353 B1 | 3/2007 | Crinon | |
| 7,191,129 B2 | 3/2007 | Brown et al. | |
| 7,196,718 B1 | 3/2007 | Barbeau et al. | |
| 7,197,557 B1 | 3/2007 | Asar et al. | |
| 7,197,765 B2 | 3/2007 | Chan et al. | |
| 7,200,632 B1 | 4/2007 | Greschler et al. | |
| 7,200,638 B2 | 4/2007 | Lake | |
| 7,200,749 B2 | 4/2007 | Wheeler et al. | |
| 7,202,814 B2 | 4/2007 | Caspi et al. | |
| 7,203,703 B2 | 4/2007 | Clement et al. | |
| 7,206,747 B1 | 4/2007 | Morgan et al. | |
| 7,206,788 B2 | 4/2007 | Horvitz et al. | |
| 7,206,851 B2 | 4/2007 | Delaney et al. | |
| 7,206,854 B2 | 4/2007 | Kauffman et al. | |
| 7,207,008 B1 | 4/2007 | Koch | |
| 7,207,058 B2 | 4/2007 | Barrett | |
| 7,209,468 B2 | 4/2007 | Twitchell, Jr. | |
| 7,210,161 B2 | 4/2007 | Ward et al. | |
| 7,212,574 B2 | 5/2007 | Abrams, Jr. et al. | |
| 7,212,656 B2 | 5/2007 | Liu et al. | |
| 7,213,005 B2 | 5/2007 | Mourad et | |

(56) References Cited

U.S. PATENT DOCUMENTS 7,215,793 B2 5/2007 Takahashi
7,216,101 B2 5/2007 Renwick et al.
7,216,154 B1 5/2007 Chow et al.
7,216,170 B2 5/2007 Ludvig et al.
7,218,759 B1 5/2007 Ho et al.
7,219,066 B2 5/2007 Parks et al.
7,219,068 B2 5/2007 Zelek et al.
7,221,668 B2 5/2007 Twitchell, Jr.
7,222,078 B2 5/2007 Abelow
7,222,163 B1 5/2007 Girouard et al.
7,222,269 B2 5/2007 Kurinami et al.
7,222,357 B2 5/2007 Anderson et al.
7,224,774 B1 5/2007 Brown et al.
7,225,256 B2 5/2007 Villavicencio
7,225,462 B2 5/2007 Bass et al.
7,227,475 B1 6/2007 Provenzano et al.
7,227,529 B2 6/2007 Suomela
7,227,582 B2 6/2007 MacInnis et al.
7,227,937 B1 6/2007 Yoakum et al.
7,228,335 B2 6/2007 Caughey
7,228,551 B2 6/2007 Karagounis et al.
7,228,555 B2 6/2007 Schlack
7,230,529 B2 6/2007 Ketcherside, Jr. et al.
7,230,653 B1 6/2007 Overton et al.
7,231,099 B1 6/2007 Basso et al.
7,231,428 B2 6/2007 Teague
7,231,517 B1 6/2007 Mashayekhi
7,231,603 B2 6/2007 Matsumoto
7,231,661 B1 6/2007 Villavicencio et al.
7,233,971 B1 6/2007 Levy
7,239,880 B2 7/2007 Shaheen
7,240,100 B1 7/2007 Wein et al.
7,240,111 B2 7/2007 VanHarlingen et al.
7,240,125 B2 7/2007 Fleming
7,240,298 B2 7/2007 Grossman et al.
7,240,355 B1 7/2007 Eldering et al.
7,240,359 B1 7/2007 Sie et al.
7,242,305 B2 7/2007 Cuddihy et al.
7,242,408 B1 7/2007 Dunn
7,243,129 B1 7/2007 Thomas
7,243,130 B2 7/2007 Horvitz et al.
7,243,164 B2 7/2007 Vegge
7,243,336 B2 7/2007 Brockway et al.
7,246,105 B2 7/2007 Numanoi et al.
7,246,137 B2 7/2007 Paulus et al.
7,246,174 B2 7/2007 Sciandra et al.
7,246,243 B2 7/2007 Uchida
7,246,244 B2 7/2007 Nanavati et al.
7,248,933 B2 7/2007 Wildman
7,249,059 B2 7/2007 Dean et al.
7,249,145 B1 7/2007 Rock et al.
7,250,978 B2 7/2007 Lee et al.
7,251,750 B2 7/2007 Oshima
7,257,397 B2 8/2007 Shamoon et al.
7,257,617 B2 8/2007 Brown et al.
7,257,815 B2 8/2007 Gbadegesin et al.
7,260,369 B2 8/2007 Feher
7,260,498 B2 8/2007 Battenfelder et al.
7,260,564 B1 8/2007 Lynn et al.
7,260,597 B1 8/2007 Hofrichter et al.
7,260,627 B2 8/2007 Kryskow, Jr. et al.
7,260,632 B2 8/2007 Shaffer et al.
7,260,633 B2 8/2007 Lette et al.
7,262,789 B2 8/2007 Jones
7,263,073 B2 8/2007 Petite et al.
7,263,535 B2 8/2007 Malik
7,263,709 B1 8/2007 Krapf
7,266,185 B2 9/2007 Trandal et al.
7,266,395 B2 9/2007 Schnurr
7,266,595 B1 9/2007 Black et al.
7,268,830 B2 9/2007 Lee
7,269,292 B2 9/2007 Steinberg
7,269,629 B2 9/2007 Zmudzinski et al.
7,271,742 B2 9/2007 Sheha et al.
7,272,179 B2 9/2007 Siemens et al.
7,272,633 B2 9/2007 Malik et al.
7,272,641 B2 9/2007 Yamagishi
7,272,657 B2 9/2007 Allen et al.
7,275,083 B1 9/2007 Seibel et al.
7,275,259 B2 9/2007 Jamieson et al.
7,280,529 B1 10/2007 Black et al.
7,286,143 B2 10/2007 Kang et al.
7,287,230 B2 10/2007 Austin et al.
7,289,124 B2 10/2007 Breton et al.
7,290,278 B2 10/2007 Cahill et al.
7,292,238 B1 11/2007 Van Overveld et al.
7,295,253 B1 11/2007 Gerstman
7,295,752 B1 11/2007 Jain et al.
7,296,235 B2 11/2007 Bhat et al.
7,299,277 B1 11/2007 Moran et al.
7,299,286 B2 11/2007 Ramsayer et al.
7,302,634 B2 11/2007 Lucovsky et al.
7,302,693 B2 11/2007 Windheim et al.
RE39,942 E 12/2007 Fai et al.
7,303,474 B2 12/2007 Anderson et al.
7,305,691 B2 12/2007 Cristofalo
7,305,696 B2 12/2007 Thomas et al.
7,305,699 B2 12/2007 Crinon et al.
7,307,574 B2 12/2007 Kortum et al.
7,308,492 B2 12/2007 Konopka et al.
7,310,110 B2 12/2007 Grindstaff et al.
7,310,532 B2 12/2007 Knauerhase et al.
7,312,809 B2 12/2007 Bain et al.
7,313,592 B1 12/2007 Huboi et al.
7,313,760 B2 12/2007 Grossman et al.
7,313,802 B1 12/2007 Tomsen
7,315,243 B1 1/2008 Speakman et al.
7,315,630 B2 1/2008 Steinberg et al.
7,315,983 B2 1/2008 Evans et al.
7,317,908 B1 1/2008 Eason
7,318,107 B1 1/2008 Menon
7,320,073 B2 1/2008 Zissimopoulos et al.
7,321,342 B2 1/2008 Nagae
7,321,826 B2 1/2008 Sheha et al.
7,321,877 B2 1/2008 McKegney et al.
7,322,040 B1 1/2008 Olson et al.
7,324,166 B1 1/2008 Joslin et al.
7,324,528 B2 1/2008 Szlam
7,325,058 B1 1/2008 Sheth et al.
7,327,229 B1 2/2008 Nichols et al.
7,328,448 B2 2/2008 Eldering et al.
7,330,875 B1 2/2008 Parasnis et al.
7,330,878 B2 2/2008 Slavin et al.
7,330,893 B2 2/2008 Qiu et al.
7,337,237 B2 2/2008 Salahshoor et al.
7,340,171 B2 3/2008 Song et al.
7,340,505 B2 3/2008 Lisiecki et al.
7,340,512 B2 3/2008 Cochran et al.
7,340,760 B2 3/2008 Wachtfogel et al.
7,340,765 B2 3/2008 Feldmeier
7,340,766 B2 3/2008 Nagao et al.
7,343,317 B2 3/2008 Jokinen et al.
7,343,557 B2 3/2008 Arend et al.
7,346,405 B2 3/2008 Yeh et al.
7,346,496 B2 3/2008 Stanford
7,346,661 B2 3/2008 Yu
7,346,676 B1 3/2008 Swildens et al.
7,346,697 B2 3/2008 Zhang et al.
7,349,856 B2 3/2008 Ackermann et al.
7,350,224 B2 3/2008 Creamer et al.
7,352,880 B2 4/2008 Kim et al.
7,353,266 B2 4/2008 Bracewell et al.
7,353,272 B2 4/2008 Robertson et al.
7,353,282 B2 4/2008 Nichols et al.
7,353,455 B2 4/2008 Malik
7,356,137 B1 4/2008 Burg et al.
7,356,567 B2 4/2008 Odell et al.
7,356,606 B2 4/2008 Choate
7,359,496 B2 4/2008 Qian et al.
7,359,547 B2 4/2008 Noto et al.
7,359,622 B2 4/2008 Monroe et al.
7,359,944 B2 4/2008 An
7,360,152 B2 4/2008 Capps et al.
7,360,164 B2 4/2008 Bjoernsen et al.

(56) References Cited

U.S. PATENT DOCUMENTS 7,360,172 B2 4/2008 Grossman et al.
7,360,174 B2 4/2008 Grossman et al.
7,362,368 B2 4/2008 Steinberg et al.
7,363,339 B2 4/2008 Delany et al.
7,365,655 B2 4/2008 Rao et al.
7,366,646 B1 4/2008 Gill et al.
7,366,687 B2 4/2008 Yoshimine et al.
7,366,709 B2 4/2008 Nevin et al.
7,366,913 B1 4/2008 Haley
7,367,049 B1 4/2008 Robinson et al.
7,369,536 B2 5/2008 Donovan et al.
7,369,660 B1 5/2008 Kahn et al.
7,369,808 B2 5/2008 Wessner et al.
7,370,071 B2 5/2008 Greschler et al.
7,370,074 B2 5/2008 Alexander et al.
7,370,356 B1 5/2008 Guo
7,372,976 B2 5/2008 Rhoads et al.
7,373,403 B2 5/2008 Kroboth et al.
7,373,428 B1 5/2008 Armstrong et al.
7,373,660 B1 5/2008 Guichard et al.
7,373,661 B2 5/2008 Smith et al.
7,376,153 B2 5/2008 Coleman et al.
7,376,414 B2 5/2008 Engstrom
7,376,735 B2 5/2008 Straut et al.
7,376,736 B2 5/2008 Sundaram et al.
7,376,751 B2 5/2008 Gautier
7,376,823 B2 5/2008 Iszlai et al.
7,382,268 B2 6/2008 Hartman
7,382,868 B2 6/2008 Moore et al.
7,383,232 B2 6/2008 Fox
7,383,303 B1 6/2008 Bort
7,383,355 B1 6/2008 Berkman et al.
7,388,519 B1 6/2008 Kreft
7,388,601 B2 6/2008 Assayag et al.
7,388,950 B2 6/2008 Elsey et al.
7,389,351 B2 6/2008 Horvitz
7,391,854 B2 6/2008 Salonen et al.
7,394,451 B1 7/2008 Patten et al.
7,395,075 B2 7/2008 Posner et al.
7,395,329 B1 7/2008 Holt et al.
7,398,541 B2 7/2008 Bennington et al.
7,403,786 B2 7/2008 Caspi et al.
7,409,403 B1 8/2008 Faraldo, II
7,409,428 B1 8/2008 Brabec et al.
7,409,445 B2 8/2008 Markos et al.
7,412,042 B2 8/2008 Henry
7,412,374 B1 8/2008 Seiler et al.
7,412,505 B2 8/2008 Slemmer et al.
7,412,527 B2 8/2008 Pulver et al.
7,412,720 B1 8/2008 Frey et al.
7,418,085 B2 8/2008 Rodkey et al.
7,426,530 B1 9/2008 Rosko et al.
7,428,004 B2 9/2008 Creamer et al.
7,428,005 B2 9/2008 Creamer et al.
7,428,531 B2 9/2008 Barron et al.
7,428,750 B1 9/2008 Dunn et al.
7,430,719 B2 9/2008 Pettinati et al.
7,430,743 B2 9/2008 Watt et al.
7,433,710 B2 10/2008 Bodnar et al.
7,433,740 B2 10/2008 Hesse et al.
7,434,011 B2 10/2008 Shue
7,434,220 B2 10/2008 Husain et al.
7,434,242 B1 10/2008 Goode
7,434,246 B2 10/2008 Florence
7,458,080 B2 11/2008 Parker et al.
7,529,850 B2 5/2009 Verma et al.
7,544,321 B2 6/2009 Loebner et al.
7,557,689 B2 7/2009 Seddigh et al.
7,558,558 B2 7/2009 Langsenkamp et al.
7,559,031 B2 7/2009 Kawamura et al.
7,565,153 B2 7/2009 Alcock et al.
7,574,381 B1 8/2009 Lin-Hendel
7,584,493 B2 9/2009 Sibley et al.
7,589,760 B2 9/2009 Zhang et al.
7,593,842 B2 9/2009 Rousseau
7,599,473 B2 10/2009 Michael et al.
7,603,538 B2 10/2009 Kitayama et al.
7,604,592 B2 10/2009 Freeman et al.
7,616,099 B2 11/2009 Mackjust et al.
7,620,565 B2 11/2009 Abelow
7,627,471 B2 12/2009 Creamer et al.
7,664,233 B1 2/2010 Kirchmeier et al.
7,672,378 B2 3/2010 Ng et al.
7,680,694 B2 3/2010 Glazer et al.
7,685,265 B1 3/2010 Nguyen et al.
7,689,421 B2 3/2010 Li et al.
7,694,235 B2 4/2010 Stautner et al.
7,707,614 B2 4/2010 Krikorian et al.
7,721,301 B2 5/2010 Wong et al.
7,747,960 B2 6/2010 Garibaldi et al.
7,769,910 B2 8/2010 Krzyzanowski
7,779,446 B2 8/2010 Westbrook et al.
7,792,676 B2 9/2010 Klinefelter et al.
7,797,712 B2 9/2010 Klosterman et al.
7,808,378 B2 10/2010 Hayden
7,839,298 B2 11/2010 Hardacker et al.
7,852,407 B2 12/2010 Park
7,877,262 B2 1/2011 Luisi
8,612,363 B2 * 12/2013 Karkanias et al. .............. 706/11
2001/0017656 A1 8/2001 Araki et al.
2001/0033344 A1 10/2001 Grein et al.
2002/0018124 A1 2/2002 Mottur et al.
2002/0087473 A1 7/2002 Harif
2002/0087481 A1 7/2002 Harif
2002/0097322 A1 7/2002 Monroe et al.
2002/0105533 A1 8/2002 Cristo
2002/0111972 A1 8/2002 Lynch et al.
2002/0138847 A1 9/2002 Abrams et al.
2002/0145621 A1 10/2002 Nguyen
2002/0173999 A1 11/2002 Griffor et al.
2002/0198713 A1 12/2002 Franz et al.
2003/0061344 A1 3/2003 Monroe
2003/0065757 A1 4/2003 Mentze et al.
2003/0115059 A1 6/2003 Jayaratne
2003/0140107 A1 7/2003 Rezvani et al.
2003/0177388 A1 9/2003 Botz et al.
2003/0182177 A1 9/2003 Gallagher et al.
2003/0193577 A1 10/2003 Doring et al.
2003/0202576 A1 10/2003 Enright
2003/0210327 A1 11/2003 Mory et al.
2004/0028391 A1 2/2004 Black et al.
2004/0032940 A1 2/2004 Gray
2004/0073944 A1 4/2004 Booth
2004/0080624 A1 4/2004 Yuen
2004/0105005 A1 6/2004 Yamamoto et al.
2004/0116109 A1 6/2004 Gibbs et al.
2004/0133689 A1 7/2004 Vasisht
2004/0139208 A1 7/2004 Tuli
2004/0172368 A1 9/2004 Johnson
2004/0179116 A1 9/2004 Stavely et al.
2004/0186837 A1 9/2004 Lambert et al.
2004/0201608 A1 10/2004 Ma et al.
2004/0201668 A1 10/2004 Matsubara et al.
2004/0205011 A1 10/2004 Northington et al.
2004/0212679 A1 10/2004 Jun
2004/0240650 A1 12/2004 Bear et al.
2004/0257472 A1 12/2004 Mpr et al.
2004/0260651 A1 12/2004 Chan et al.
2004/0264579 A1 12/2004 Bhatia et al.
2005/0020358 A1 1/2005 Cram
2005/0021472 A1 1/2005 Gettman et al.
2005/0028215 A1 2/2005 Ahiska
2005/0036659 A1 2/2005 Talmon et al.
2005/0044014 A1 2/2005 Tilis et al.
2005/0044423 A1 2/2005 Mellmer et al.
2005/0059385 A1 3/2005 Twigg et al.
2005/0059488 A1 3/2005 Larsen et al.
2005/0091597 A1 4/2005 Ackley
2005/0108372 A1 5/2005 Guo et al.
2005/0114490 A1 5/2005 Redlich et al.
2005/0114527 A1 5/2005 Hankey et al.
2005/0121511 A1 6/2005 Robbins, Jr. et al.
2005/0128048 A1 6/2005 Krzyzanowski et al.
2005/0132041 A1 6/2005 Kundu

(56) References Cited

U.S. PATENT DOCUMENTS

2005/0144135 A1 6/2005 Juarez et al.
2005/0177859 A1 8/2005 Valentino, III et al.
2005/0190263 A1 9/2005 Monroe et al.
2005/0198125 A1 9/2005 Macleod Beck et al.
2005/0210394 A1 9/2005 Crandall et al.
2005/0212968 A1 9/2005 Ryal
2005/0231500 A1 10/2005 Isobe et al.
2005/0240970 A1 10/2005 Schwalb et al.
2005/0288820 A1 12/2005 Wu et al.
2006/0001741 A1 1/2006 Hsu et al.
2006/0008087 A1 1/2006 Olive
2006/0012702 A1 1/2006 Kawahara et al.
2006/0023066 A1 2/2006 Li et al.
2006/0028551 A1 2/2006 Kim
2006/0062430 A1 3/2006 Vallone et al.
2006/0062564 A1 3/2006 Dalton et al.
2006/0064716 A1 3/2006 Sull et al.
2006/0089992 A1 4/2006 Blaho
2006/0092269 A1 5/2006 Baird et al.
2006/0095472 A1 5/2006 Krikorian et al.
2006/0101456 A1 5/2006 Crosier et al.
2006/0139447 A1 6/2006 Unkrich
2006/0155836 A1 7/2006 Chang et al.
2006/0167971 A1 7/2006 Breiner
2006/0168167 A1 7/2006 Kushalnagar et al.
2006/0168647 A1 7/2006 Chiloyan
2006/0171369 A1 8/2006 Ostrup et al.
2006/0179463 A1 8/2006 Chisholm et al.
2006/0195716 A1 8/2006 Bittner
2006/0218042 A1 9/2006 Cruz
2006/0225112 A1 10/2006 Walker et al.
2006/0225113 A1 10/2006 Walker et al.
2006/0225114 A1 10/2006 Walker et al.
2006/0232677 A1 10/2006 Butaney et al.
2006/0233168 A1 10/2006 Lewites et al.
2006/0246970 A1 11/2006 Smith et al.
2006/0258332 A1 11/2006 Jennings et al.
2006/0258420 A1 11/2006 Mullen
2006/0262140 A1 11/2006 Kujawa et al.
2006/0268360 A1 11/2006 Jones
2006/0274828 A1 12/2006 Siemens et al.
2007/0002131 A1 1/2007 Ritchey
2007/0037625 A1 2/2007 Edwards
2007/0039030 A1 2/2007 Romanowich et al.
2007/0043687 A1 2/2007 Bodart et al.
2007/0050054 A1 3/2007 Sambandam Guruparan et al.
2007/0050362 A1 3/2007 Low et al.
2007/0058612 A1 3/2007 Bushmitch
2007/0061477 A1 3/2007 Stoyanov et al.
2007/0064095 A1 3/2007 Baartman et al.
2007/0064109 A1 3/2007 Renkis
2007/0112570 A1 5/2007 Kaneyasu
2007/0122029 A1 5/2007 Mowry
2007/0147701 A1 6/2007 Tanaka
2007/0150532 A1 6/2007 Feldis et al.
2007/0155508 A1 7/2007 Sun et al.
2007/0156857 A1 7/2007 King et al.
2007/0156982 A1 7/2007 Meiri et al.
2007/0179955 A1 8/2007 Croft et al.
2007/0180448 A1 8/2007 Low et al.
2007/0188597 A1 8/2007 Kenoyer
2007/0191023 A1 8/2007 Walter
2007/0198669 A1 8/2007 Convertino et al.
2007/0208513 A1 9/2007 Hillman
2007/0208813 A1 9/2007 Blagsvedt et al.
2007/0217763 A1 9/2007 Siemens et al.
2007/0250605 A1 10/2007 Duchene et al.
2007/0254634 A1 11/2007 Costa-Requena et al.
2007/0268121 A1 11/2007 Vasefi et al.
2007/0288974 A1 12/2007 Creamer et al.
2007/0291119 A1 12/2007 Amico et al.
2007/0296574 A1 12/2007 Smith et al.
2007/0298401 A1 12/2007 Mohanty et al.
2008/0004969 A1 1/2008 Shniberg et al.
2008/0030363 A1 2/2008 Rezvani et al.
2008/0034078 A1 2/2008 Sano et al.
2008/0034276 A1 2/2008 Ficco
2008/0036875 A1 2/2008 Jones et al.
2008/0049020 A1 2/2008 Gusler et al.
2008/0049098 A1 2/2008 Jones
2008/0059304 A1 3/2008 Kimsey
2008/0059533 A1 3/2008 Krikorian
2008/0060034 A1 3/2008 Egnal et al.
2008/0088624 A1 4/2008 Long et al.
2008/0091763 A1 4/2008 Devonshire et al.
2008/0096533 A1 4/2008 Manfredi et al.
2008/0096665 A1 4/2008 Cohen
2008/0098411 A1 4/2008 Dirstine et al.
2008/0108339 A1 5/2008 Shaffer et al.
2008/0122932 A1 5/2008 Kibbie et al.
2008/0133735 A1 6/2008 Thayer et al.
2008/0136628 A1 6/2008 Ishii
2008/0158336 A1 7/2008 Benson et al.
2008/0208844 A1 8/2008 Jenkins
2008/0211766 A1 9/2008 Westerman et al.
2008/0211915 A1 9/2008 McCubbrey
2008/0220875 A1 9/2008 Sohl et al.
2008/0220876 A1 9/2008 Mehta et al.
2008/0227548 A1 9/2008 Choudhry et al.
2008/0263184 A1 10/2008 De Haan et al.
2008/0319910 A1 12/2008 Duffus et al.
2009/0017913 A1 1/2009 Bell et al.
2009/0088254 A1 4/2009 Courage et al.
2009/0106671 A1 4/2009 Olson et al.
2009/0225693 A1 9/2009 Yi et al.
2009/0231411 A1 9/2009 Yan
2009/0231415 A1 9/2009 Moore et al.
2009/0232020 A1 9/2009 Baalbergen et al.
2009/0254843 A1 10/2009 Van Wie et al.
2009/0256965 A1 10/2009 Moote et al.
2009/0257436 A1 10/2009 Qu
2010/0053867 A1 3/2010 Ellis et al.
2010/0056280 A1 3/2010 Langan et al.
2010/0066807 A1 3/2010 Eisenberg
2010/0067906 A1 3/2010 Adhikari et al.
2010/0080528 A1 4/2010 Yen et al.
2010/0121729 A1 5/2010 Betzler et al.
2010/0185434 A1 7/2010 Burvall et al.
2010/0185514 A1* 7/2010 Glazer et al. ............... 705/14.51
2010/0225742 A1 9/2010 Shelton et al.
2010/0226627 A1 9/2010 Barton et al.
2010/0235861 A1 9/2010 Schein et al.
2010/0269130 A1 10/2010 Gupta
2010/0269138 A1 10/2010 Krikorian et al.
2010/0299150 A1 11/2010 Fein et al.
2010/0299695 A1 11/2010 Watson et al.
2010/0312547 A1 12/2010 Van Os et al.
2010/0313213 A1 12/2010 Ellis et al.
2010/0319014 A1 12/2010 Lockett et al.
2010/0319020 A1 12/2010 Yuen et al.

OTHER PUBLICATIONS

Michael Cooke et al., "The Sum of the Parts," strategy+business, pp. 1-5 (Jun. 17, 2008) www.strategy-business.com.
Michael Crichton, "Mediasaurus," WIRED, pp. 1-6 (2008).
Michele Zanini, "Using 'power curves' to assess industry dynamics," McKinsey & Co., The McKinsey Quarterly, pp. 1-5 (Nov. 2008).
Mihir A. Desai, "The Decentering of the Global Firm," Harvard University, Harvard Business School, Working Paper 09-054 pp. 1-23(Sep. 2008).
Mikael Lofstrand, et al., "Sun's Pattern-Based Design Framework: The Service Delivery Network," Sun Microsystems, Inc., Sun BluePrints OnLine, pp. 1-30 (Sep. 2005).
Mike Kuniaysky, "Sketching Smart Things," THING M, pp. 1-37(Jan. 9, 2008).
Mike Piech, "Platform-as-a-Service Private Cloud with Oracle Fusion Middleware," Oracle, pp. 1-20 (Oct. 2009).
Mona Mourshed et al., "How the world's most improved school systems keep getting better," McKinsey & Company, pp. 1-140 (Nov. 2010).
Moore, "The End Goal: ISC Convergence," IBM Corporation, pp. 1-6 (Apr. 2004).

(56) References Cited

OTHER PUBLICATIONS

Nathan Myhrvold, "The Big Idea: Funding Eureka!" Harvard Business Review, pp. 1-8 (2010) http://hbr.org/2010/03/the-big-idea-funding-eureka.
Nikki Pfarr et al., "An Introduction to: Brains, Behavior & Design: Tools to understand and influence decision making," IIT Institute of Design, pp. 1-26 (2010).
Nokia "A vision of tomorrow's connected world," Nokia Siemens Networks, pp. 1-20 (2008).
Oliver Bimber, "Capturing the World," IEEE:COMPUTER, pp. 22-23 (Jun. 2010).
Oracle, "Build Your Own Portlets," Oracle Corporation, pp. 1-6 (2008) http://www.oracle.com/technology/products/iportal/htdocs/3_0_8_qt/qt_frm.htm.
Overview Clusters, Segments, and Pips, RosettaNet, Version 02-04-00, pp. 1-116 (Apr. 23, 2008).
P. Jonathon Phillips et al., "FRVT 2006 and ICE 2006 Large-Scale Results," NISTIR 7408, pp. 1-55 (Mar. 29, 2007).
Paul Earle et al., "Life Sciences Monitor: Overseeing Innovation: The Role of the Corporate Science and Technology Committee," SpencerStuart, pp. 1-12 (2007).
Paul M. Romer, "Endogenous Technological Change," The Journal of Political Economy, 98:S71-S102 (Oct. 1990).
Peter Brusilovsky, "Knowledge Tree: A Distributed Architecture for Adaptive E-Learning," ACM, pp. 1-10 (May 2004).
Peter Cheese, "Disturbing the System," Accenture, pp. 1-5 (Jun. 2004).
Peter Dolog, et al., "Personalization in Distributed e-Learning Environments," ACM, pp. 1-10 (May 2004).
Peter Lubbers, "Oracle WebCenter Framework: Developer's Guide," ORACLE, pp. 1-818 (Mar. 2007).
Peter Lucas et al., "The Information Commons Gazetteer," MAYA Design, Inc., pp. 1746-1751 (2006).
Peter Thoeny, "OpenPortal Portlet Repository," Java.net, pp. 1-2, (Nov. 29, 2007) http://wiki.java.net/bin/view/OpenPortal/PortletRepository.
Peter Thoeny, "OpenPortal: Welcome to the OpenPortal Community Wiki," Java.net, pp. 1-3 (Nov. 29, 2007) http://wiki.java.net/bin/view/OpenPortal.
Peter Troger et al., "SOA Meets Robots—A Service-Based Software Infrastructure for Remote Laboratories," International Journal of Online Engineering (iJOE), 4:1-6 (2008).
Peter van Rosmalen et al., "Towards an open framework for adaptive, agent-supported e-learning," ETEC, Open University of the Netherlands, pp. 1-17 (2003).
Premkumar Devanbu et al., "A Knowledge-Based Software Information System," TOOLS, pp. 110-115.
Program Manager, "Information Sharing Environment Enterprise Architecture Framework," ISE Enterprise Architecture Framework, Version 1.0, pp. 1-124(Aug. 2007) www.ise.gov.
Program Manager, "Information Sharing Environment Enterprise Architecture Framework," ISE Enterprise Architecture Framework, Version 2.0, pp. 1-234 (Sep. 2008) www.ise.gov.
R.L. Feldmann et al., "Towards Industrial-Strength Measurement Programs for Reuse and Experience Repository Systems," Fraunhofer Institute for Experimental Software Engineering (2000) www.iese.fraunhofer.de/Staff/nick/documents/pdf_files/LSO_paper_crci.pdf.
Raena Jackson Armitage, "Tech Times," SitePoint, Issue 259:1-9 (Sep. 29, 2009).
Ramon Casadesus-Masanell et al., "Platform Competition, Compatibility, and Social Efficiency," Harvard Business School, pp. 1-48 (Oct. 14, 2008).
Randall B. Smith, "Experiences With the Alternate Reality Kit: An Example of the Tension Between Literalism and Magic," CHI +GI, Xerox Palo Alto Research Center, pp. 61-67 (1987).
Raymond P. Niro et al., What Is a "Patent Troll"?
Reuters, "E-paper Set to Go on a Tear," RED HERRING, pp. 1-2 (Jun. 7, 2007).
RNIF 2.0—Status (Technical Advisory), RosettaNet, pp. 1-2 (Jun. 2003).
RNIF 2.0 Technical Advisory & Recommendation, RosettaNet, pp. 1-3 (Sep. 2004).
Robert D. Hof, "The End of Work As You Know It," BusinessWeek, pp. 1-2 (Aug. 20, 2007).
Robert Lemos, "BIOS Maker Aims to Retake the PC," Technology Review, pp. 1-3 (May 13, 2009) http://www.technologyreview.com/printer_friendly_article.
Robert M. Solow, "A Contribution to the Theory of Economic Growth," The Quarterly Journal of Economics, 70:65-94 (Feb. 1956).
Ross Dawson et al., "Service Delivery Innovation: Creating Client Value and Enhancing Profitability," SAP America, Inc., pp. 1-16 (2007).
Ryan Lampe et al., "Do Patent Pools Encourage Innovation? Evidence from the 19$^{th}$—Century Sewing Machine Industry*" Stanford University, pp. 1-36 (Dec. 7, 2008) http://ssrn.com/abstract.
S. Liu et al., "On Demand Network and Application Provisioning Through Web Services*" IEEE:NRC 49343, pp. 1-9 (Jul. 2007).
S. Liu et al., "Towards a Service-Oriented Participatory Design Studio Supported by UCLP," National Research Council Canada, pp. 1-3 (Sep. 2006).
Sean Michael Kerner, "Google Chrome OS—a new open source Linux distro," INTERNETNEWS.COM, pp. 1-4 (Jul. 8, 2009).
Sean Michael Kerner, "Your Network Will Know Who You Are, What You Want," Internet.com, pp. 1-2 (Dec. 28, 2007), PART 1, http://www.internetnews.com/bus-news/print.php/10791_3718841_2.
Sean Michael Kerner, "Your Network Will Know Who You Are, What You Want," Internet.com, pp. 1-2 (Dec. 28, 2007), PART 2, http://www.internetnews.com/bus-news/print.php/10791_3718841_2.
Sean Silverthorne, "The 37$^{th}$ Button on Your Remote Control," CNET Networks, Inc., pp. 1-2 (Mar. 21, 2008).
Sebastien Laborie et al., "Managing and Querying Distributed Multimedia Metadata," IEEE Computer Society, pp. 12-21 (Oct.-Dec. 2009).
SGEA—Reference Models, Hanbook of Enterprise Systems Architecture, NUS, pp. 16-22 (2008).
Shenghui Zhao et al., "The Enhancement Bias in Consumer Decisions to Adopt and Utilize Product Innovations," Wharton School of Business, pp. 1-51.
Siew Poh Lee et al., "Web Services Implementation Methodology for SOA Application," Industrial Informatics, IEEE International Conference, pp. 335-340 (2006).
Simon Crosby et al., "Protecting Virtual Machines: The "Best of VMworld" Approach," CITRIX, pp. 1-7 (2007) www.marathontechnologies.com.
Simon Guest, "Mobile Architecture," The Architecture Journal, 14:1-43 (2007) www.ArchitectureJournal.net.
Simon Guest, "Web Architecture," The Architecture Journal, 12:1-40 (2007), www.ArchitectureJournal.net.
Simon Lucey et al., "AAM Derived Face Representations for Robust Facial Action Recognition," IEEE, pp. 1-6 (2006).
Simon Lucey et al., "Investigating Spontaneous Facial Action Recognition through AAM Representations of the Face," Face Recognition, pp. 395-406 (2007).
Simson Garfinkel, "Kill the Operating System!: When designing computers, companies could take a lesson from Hollywood," Technology Review, pp. 1-3 (2006).
Stephan Shankland, "Google mapping spec now an industry standard," CNET News, pp. 1-2 (Apr. 14, 2008).
Stephen B. Morris et al., "Doing away with manual, real-time management," IBM, pp. 1-6 (Oct. 10, 2006).
Stephen Cass, "Just Another Online Fad—or the Biggest Revolution Since the Internet?" Technology Review, pp. 1-3 (Jul./Aug. 2009).
Stephen J. Davis et al., "Using Social Networking and Collections to Enable Video Semantics Acquisition," IEEE Computer Society, pp. 52-61 (Oct.-Dec. 2009).
Stephen Ross-Talbot, "Orchestration and Choreography: Standards, Tools and Technologies for Distributed Workflows," NETTAB Workshop, pp. 1-8 (2005) www.nettab.org/2005/docs/NETTAB2005_Ross-TalbotOral.pdf.
Stephen Ruth et al., "The World Is Digital," IEEE Internet Computing, pp. 88-92 (Nov./Dec. 2009).

(56) References Cited

OTHER PUBLICATIONS

Stephen Shankland, "Google Earth brings virtual tourism to iPhone," CNET News, pp. 1-6 (Oct. 26, 2008).
Steve Kangas et al., "Learning from Event Logging," NetConversions, Inc., pp. 1-6 (Jun. 2001).
Sun Microsystems, "Deployment Example: Deploying and Customizing the Documentum Portlet," Sun Microsystems, Inc., pp. 1-46 (Jun. 2007).
Surekha Durvasula et al., "SOA Practitioners' Guide, Part 2, SOA Reference Architecture," pp. 1-47 www.soablueprint.com/whitepapers/SOAPGPart2 (2008).
Susan Cantrell et al., "Techniques for Managing a Workforce of One: Management Practices that Recognize the Individual," Accenture Institute for High Performance Business, pp. 1-9 (Feb. 2007).
Susan Cantrell et al., "Techniques for Managing a Workforce of One: Segmentation," Accenture Institute for High Performance Business, pp. 1-8 (Jan. 2007).
Susan Cantrell et al., "Techniques for Managing a Workforce of One: Modular Choice," Accenture Institute for High Performance Business, pp. 1-5 (Jan. 2007).
Susan Cantrell et al., "Techniques for Managing a Workforce of One: Flexible Policies," Accenture Institute for High Performance Business, pp. 1-7 (Feb. 2007).
Susan Cantrell et al., "The Workforce of One: An Overview," Accenture Institute for High Performance Business, pp. 1-5 (Oct. 2006).
Susan Cantrell et al., "Trends Driving the Workforce of One," Accenture Institute for High Performance Business, pp. 1-5 (Oct. 2006).
Susan Cantrell et al., "Workforce of One: A New Approach to Human Capital Management," Accenture Institute for High Performance Business, pp. 1-6 (Oct. 2006).
Susan Cantrell et al., "Workforce of One: Confronting Organizational Challenges," Accenture Institute for High Performance Business, pp. 1-7 (Mar. 2007).
Susan Cantrell et al., "Workforce of One: The Role of Employees," Accenture Institute for High Performance Business, pp. 1-4 (Mar. 2007).
Susan Cantrell et al., "Workforce of One: The Role of Human Resources," Accenture Institute for High Performance Business, pp. 1-8 (Apr. 2007).
Susan Cantrell et al., "Workforce of One: Is It Right for My Organization?" Accenture Institute for High Performance Business, pp. 1-3 (Feb. 2007).
Susan Cantrell et al., "Workforce of One: The Role of Senior Leaders," Accenture Institute for High Performance Business, pp. 1-3(Apr. 2007).
Susan Cantrell et al., "Workforce of One: The Role of the Line Manager," Accenture Institute for High Performance Business, pp. 1-6 (Mar. 2007).
Susan Gauch et al., "User Profiles for Personalized Information Access," Electrical Engineering and Computer Science, pp. 1-37 (2007).
System Architecture Primer, Northwestern University, pp. 1-7 (Jan. 2004).
Technical Advisory B, RosettaNet, Issue 01.00.00 pp. 1-17 (Jun. 2, 2004).
Technical Advisory, RosettaNet, Issue 01.01.00 pp. 1-15 (Jan. 17, 2006).
Technical Recommendation: High Availability Features, RosettaNet, Issue 01.00.00 pp. 1-18 (Dec. 17, 2004).
Telexis "ViaNet™ General Information Booklet," Telexis Corporation, 1.3:1-306 (Nov. 24, 1997).
Thomas B. Sheridan, "Human supervisory control of dynamic systems," Massachusetts Institute of Technology, pp. 1-16.
Thomas Claburn, "Glide Promises to Make Any Phone an iPhone," InformationWeek.com, pp. 1-2 (Mar. 14, 2007).
Thomas Claburn, "TransMedia Adds Office Apps to Its Glide Document-Sharing Service," InformationWeek.com, pp. 1-3 (Sep. 13, 2006).
Thomas Claburn, "TransMedia Plots Death of the Desktop," InformationWeek.com, pp. 1-3 (Nov. 3, 2005).
Thomas H. Davenport et al., "How Do They Know Their Customers So Well? Lessons from the Leaders in Customer Knowledge Management," Accenture, pp. 1-13 (Aug. 2000).
Thomas Haselwanter et al., "WSMX: A Semantic Service Oriented Middleware for B2B Integration," http://www.sws-challenge.org, pp. 1-7.
Thomas R. Eisenmann, "Opening Platforms: How, When and Why?" Harvard Business School, pp. 1-27 (Aug. 31, 2008).
Todd R. McIntyre, "Intellectual Ventures Sponsored Invention Program," INTELLECTUAL VENTURES, pp. 1-2 (2010).
Tom Krazit, "Google's vision improving for image search," CNET, pp. 1-2 (Jun. 22, 2009).
Tom Simonite, "Google Offers Cloud-Based Learning Engine," Technology Review, pp. 1-4 (Aug. 20, 2010).
Vish Ganapathy et al., "Rethinking retailing with SOA: New levels of flexibility, agility and cost-efficiency," IBM Global Business Services, pp. 1-22 (2008).
Volker Kruger et al., "Appearance-based 3-D Face Recognition from Video," University of Maryland, pp. 1-8 (2002).
Wenjun Wu et al., "Service Oriented Archtiecture for VoIP conferencing," Community Grids Computing Laboratory, pp. 1-12 (2006).
Wolfgang Beinhauer et al., "User Interfaces for Service Oriented Architectures," Fraunhofer IAO, Nobelstrasse 12, 70569 Stuttgart, Germany pp. 129-132 (2005).
www.ariadne.ac.uk, "Main Articles: The Subject Portals Project Alerting Portlet" pp. 1-5 (2008).
www.bu.edu/phpbin/news-cms , Boston University School of Management, pp. 1-2 (2008).
www.csupomona.edu, Riley, H. Norton, The von Neumann Architecture of Computer Systems pp. 1-5 (Sep. 1987).
www.economist.com/specialreports, Economist.com "Clicking for gold" pp. 1-4 (Feb. 25, 2010).
www.economist.com/specialreports, Economist.com "A different game" pp. 1-5 (Feb. 25, 2010).
www.economist.com/specialreports, Economist.com "All too much" pp. 1-2 (Feb. 25, 2010).
www.economist.com/specialreports, Economist.com "Data, data everywhere" pp. 1-4 (Feb. 25, 2010).
www.economist.com/specialreports, Economist.com "Handling the cornucopia" pp. 1-3 (Feb. 25, 2010).
www.economist.com/specialreports, Economist.com "Needle in a haystack" pp. 1-2 (Feb. 25, 2010).
www.economist.com/specialreports, Economist.com "New rules for big data" pp. 1-3 (Feb. 25, 2010).
www.economist.com/specialreports, Economist.com "Show me" pp. 1-3 (Feb. 25, 2010).
www.economist.com/specialreports, Economist.com "The open society" pp. 1-3 (Feb. 25, 2010).
www.economist.com/surveys, Economist.com "Sources and acknowledgments" pp. 1-3 (Feb. 25, 2010).
"Effectively Managing Performance Measurement Systems," Consortium Learning Forum Benchmarking Report, APQC Publications, pp. 1-14 (2004).
"For Business Continuity, Don't Forget the Human Element," 1to1® Executive Dialogue Featuring Don Peppers and Martha Rogers, Ph.D., pp. 1-4 (2009).
Aberdeen Group, "The Maturity of Remote Product Service" (Apr. 2008).
Aberdeen Group, "The Value of Network and Application Visibility: Improving the Usability of Performance Data," pp. 1-22 (Sep. 2008).
Aberdeen Group "Application Performance Management: The Lifecycle Approach Brings IT and Business Together," pp. 1-24 (Jun. 2008).
Bae et al., "Service-Oriented Workflow for Digital Media Broadcasting," IBM Research Report, Computer Science, pp. 367-376 (Mar. 26, 2008).
Bhatia et al., "Applying lean producting to the public sector," The McKinsey Quarterly, pp. 1-7 (Jun. 2006).
CBDI WebServices Roadmap, "Guiding the Transition to Web Services and SOA," www.roadmap.cbdiforum.com, pp. 1-111 (2003).

(56) References Cited

OTHER PUBLICATIONS

Cisco Systems, Inc., "Cisco IOS Multicast Solutions for Internet Broadcast," Data Sheet, pp. 1-4 (2000).
Cisco Systems, Inc., "Multicast Deployment Made Easy: IP Multicast Planning and Deployment Guide," In Design Implementation Guide, pp. 1-20 (1999).
Cohn et al., "Finding and Grooming Breakthrough Innovators," Harvard Business Review (2008).
Cortada et al., "How nations thrive in the Information Age," IBM Global Business Services (2007).
Courion and Imprivata, Inc., "Day One Employee Productivity and Increased Security: Integrated Provisioning and SSO," pp. 1-6 (2007).
Experian, "Direct marketing success in today's economy: Leverage automated predictive analytics to drive marketing ROI," An Experian white paper, pp. 1-7 (2009).
Farrell et al., "Mapping the global capital markets," The McKinsey Quarterly, pp. 39-47 (2005).
Farrell et al., "The demographic deficit: How aging will reduce global wealth," The McKinsey Quarterly (Mar. 2005).
Farrell, Diana, "Governing globalization," The McKinsey Quarterly, 3:4-5 (2004).
Gabor, Andrea, "The Promise (and Perils) of Open Collaboration," Strategy + Business, 56:1-9 (Autumn 2009).
Greene, Kate, "The Display that Watches You," http://www.technologyreview.com, pp. 1-3 (Jun. 5, 2009).
Guan et al., "Evolutionary Intelligent Agents for e-Commerce: Generic Preference Detection with Feature Analysis," Electronic Commerce Research and Applications, 4(4):377-394 (2005).
Hsee and Hastie, "Decision and experience: why don't we choose what makes us happy?" Trends Cogn. Sci., 10(1):31-37 (2006).
Hsee et al., "Hedonomics in Consumer Behavior," in Handbook of consumer psychology, Mahwah, NJ: Lawrence Erlbaum Associates (2006).
Hsee, Christopher K., "Elastic Justification: How Tempting but Task-Irrelevant Factors Influence Decisions," Organizational Behavior and Human Decision Processes, 62(3):330-337 (1995).
Hsee, Christopher K., "Elastic Justification: How Unjustifiable Factors Influence Judgments," Organizational Behavior and Human Decision Processes, 66(1):122-129 (1996).
Hutchinson et al., "Navigating the Next-Generation Application Architecture," IT Pro, pp. 18-22 (Mar./Apr. 2009).
IBM Global Business Services, "Balancing Risk an dPerformance with an Integrated Finance Organization," The Global CFO Study, pp. 1-70 (2008).
Jemtrud et al., "Eucalyptus: Intelligent Infrastructure Enabled Participatory Design Studio," Winter Simulation Conference, Monterey, California (Dec. 3-6, 2006).
Liu et al., "Eucalyptus: Provisioning Resources on e-Infrastructure," The 17$^{th}$ Annual Intenrational Conference on Computer Science and Software Engineering, Toronto Ontario, Canada (Oct. 22-25, 2007).
Liu et al., "Towards an Agile Infrastructure to provision Devices, Applications and Networks: A Service-Oriented Approach," The First IEEE International Workshop on Requirements Engineering for Services/The 31$^{st}$ Annual IEEE International Computer Software and Applications Conference, Beijing, China (Jul. 23-27, 2007).
Malone et al., "Harnessing Crowds: Mapping the Genome of Collective Intelligence," MIT Sloan School Working Paper (Feb. 1, 2009).
Manouselis et al., "Quality in Metadata: A Schema for E-Commerce," Special Issue on "Advances in Digital Information Services and Metadata Research," Online Information Review, 30(3):1-30 (2006).
Mason et al., "Real-Time High Resolution Digital Video for Range and Training Applications," in Proceedings of International Telemetering Conference, pp. 1-10 (2001).
Moran and Hart, "The State of the Media Democracy: Understanding the Connected Consumer," in the Dbriefs Technology, Media & Telecommunications series, pp. 1-45 (Feb. 10, 2010).
Owen et al., "The power of many," IBM Global Business Services (2007).
Phillips, Carol, "Branding from the Inside Out: How to Approach Brand Strategy, Brand Measurement and the Management of Brands as Assets," BrandAmplitude, LLC. (2005).
Pokraev et al., "Business Level Service-Oriented Enterprise Application Integration," In Proceedings of I-ESA, pp. 1-13 (2007).
Sampson et al., "An Architecture for Web-based e-Learning Promoting Re-usable Adaptive Educational e-Content," Educational Technology & Society, 5(4):27-37 (2002).
Seeto, Terry, "Data Center 3.0 The Next Generation Data Center," Cisco Systems, Inc., pp. 1-22 (2007).
Socher, Larry, "Helping consumers manage their digital homes: The importance of premium technical services," Outlook, 1:1-2 (Jul. 2008).
Stojanovic et al., "eLearning based on the Semantic Web," World Conference on the WWW and Internet (WebNet), Orlando, Florida (2001).
Trivedi et al., "Transforming the Network Edge with Scalable Service Intelligence," Cisco Systems, Inc., pp. 1-37 (2008).
Zou et al., "Adapting the User Interface of Integrated Development Environments (IDEs) for Novice Users," Journal of Object Technology, 7(7):55-74 (2008).
"Adaptive Multivariate Testing Boosts Profits Faster," WebSiteOptimization.com, pp. 1-7 (Jul. 8, 2009).
"Adaptive software—a late bloomer," ICT Results, http://cordis.europa.eu/ictresults/index.cfm?section=news&tpl=article &BrowsingType=Features&ID=91417, pp. 1-4 (Dec. 9, 2010).
"Best Practices Make Perfect: An exclusive CMP Research Survey," The State of Information Technology Infrastructure Library (ITIL®) Adoption in North America, CMP Media LLC, pp. 1-10 (2006).
"Business process management (BPM)," http://www.ibm.com, pp. 1-6 (Jun. 10, 2008).
"Carbon Connections: Quantifying mobile's role in tackling climate change," Accenture and Vodafone, pp. 1-44 (Jul. 2009).
"Gadgets at Work: The Blurring Boundary between Consumer and Corporate Technologies," http://knowledge.wharton.upenn.edu/article.cfm?articleid=1937, pp. 1-3 (Apr. 16, 2008).
"Involving Customers in Product Development," A&C Black Publishers Ltd., pp. 1-5 (2006).
"Outsourcing Innovation," http://www.businessweek.com, pp. 1-5 (Jan. 12, 2010).
"Reimaging the Blended Contact Center," in 1to1 Executive Dialogue Featuring Don Peppers and Martha Rogers, Ph.D., Peppers & Rogers Group (2010).
"Rising Economies Hit Web with Phones," http://www.emarketer.com, pp. 1-2 (Aug. 27, 2008).
"The Enterprise of the Future," IBM Global CEO Study, pp. 1-79 (2008).
"United Nations Standard Products & Services Code (UNSPSC)," Department of Treasury and Finance, Government of Western Australia, http://www.treasury.wa.gov.au/cms/uploadedFiles/UNSTSCPackage.pdf, pp. 1-15 (Aug. 6, 2005).
"Using the UNSPSC United Nations Standard Products and Services Code," White Paper, Granada Research, pp. 1-19 (Sep. 1998, updated Oct. 2001).
"Windows Presentation Foundation (WPF)," http://www.codeplex.com/wpf, p. 1 (Dec. 23, 2008).
Accenture Communications & High Tech Solutions, "Big Trouble with "No Trouble Found" Returns: Confronting the High Cost of Customer Returns," pp. 1-8 (2008).
Accenture Communications Solutions, "The Coming of 4G: New Path to High Performance in the Emerging Digital Ecosystem," pp. 1-16 (2008).
Accenture High Tech Solutions, "Achieving high performance through superior customer service and support," pp. 1-16 (2006).
Accenture Media and Entertainment, "This time, it's personal: Engaging and interacting with consumers is the content industry's new battleground," pp. 1-36 (2009).
Accenture, "Accenture Solutions for the Connected Digital Consumer: Achieving high performance with customer-centric offerings for a "content anywhere" world," pp. 1-16 (2010).
Accenture, "Customer Relationship Management: Bringing Science to Selling Achieving High Performance through Sales Analytics," pp. 1-16 (2009).

(56) References Cited

OTHER PUBLICATIONS

Accenture, "Customer Service and Support Part One: Customers Versus Companies," pp. 1-4 (2007).
Accenture, "Information 2015: Reforming the paradigm," pp. 1-24 (2010).
Accenture, "The Accenture 2008 Global Software Study: Key Industry Trends and Evolving Requirements for Achieving High Performance," pp. 1-16 (2009).
Accenture, "The Business of Doing Business in Emerging Markets," pp. 1-10 (2007).
Accenture, "The Innovator's Advantage: A Customer Relationship Management Perspective" (2004).
Accenture, "Transforming Rights Management for High Performance," pp. 1-28 (2010).
Adams et al., "Patient-centered medical home: What, why and how?" IBM Corporation, pp. 1-36 (2009).
Agilent Technologies, "Agilent Remote Advisor: Assist. Report. Alert." pp. 1-4 (2008).
All, Ann, "Reinventing the Global Wheel with a Hub Approach," ITBusiness Edge, http://www.itbusinessedge.com/cm/blogs/all/re-inventing-the-global-wheel-with-a-hub-approach/?cs=10327, pp. 1-7 (Mar. 24, 2008).
Amir et al., "An Overlay Architecture for High Quality VoIP Streams," IEEE Transactions on Multimedia (2006).
AP Labs, "DS2 Control Software," Datasheets, pp. 1-2 (2003).
Aral et al., "Information, Technology and Information Worker Productivity: Task Level Evidence," Proc. Int. Conf. Inf. Syst., pp. 1-39 (2006).
Arar, Yardena, "Most Returned Products Work Fine, Study Says," Yahoo!News.com, p. 1 (Jun. 2, 2008).
Ariely, Dan, "2008 was a good year for behavioral economics," http://www.technologyreview.com, pp. 1-5 (May 20, 2009).
Arturo Flores et al., "Removing pedestrians from google street view Images," In IEEE International Workshop on Mobile Vision, San Francisco, CA (Jun. 2010).
AT&T Wayport, 10K Locations, p. 1 (Jul. 1, 2009).
AT&T Wayport, Homepage, p. 1 (Jul. 1, 2009).
AT&T Wayport, Roaming Services, pp. 1-3 (Jul. 1, 2009).
Axis Communications, "Axis accessories," http://www.axis.com, pp. 1-2 (Jan. 12, 2010).
Axis Communications, "Axis network cameras," http://www.axis.com, pp. 1-3 (Jan. 12, 2010).
Axis Communications, "Axis video encoders," http://www.axis.com, pp. 1-3 (Jan. 12, 2010).
Axis Communications, "Axis video management software," http://www.axis.com, pp. 1-2 (Jan. 12, 2010).
Axis Communications, "Axis-compatible camera applications," http://www.axis.com, p. 1 (Jan. 12, 2010).
Axis Communications, "Network video solutions for all industries," http://www.axis.com, p. 1 (Jan. 12, 2010).
Axis Communications, "Power over Ethernet products," http://www.axis.com, p. 1 (Jan. 12, 2010).
Axis Communications, "Redefining video quality with HDTV 1080p and new iris control," http://www.axis.com, p. 1 (Jan. 12, 2010).
Bailey, Douglas, "The Emerging Role of Global Product Classification," PowerPoint Presentation for unspsc and GS1 (Mar. 2008).
Balaguer et al., "A bigger bang: Making the right workforce investments," Outlook (May 2007).
Baldwin et al., "The Architecture of Platforms: A Unified View," Harvard Business School Working Paper (2008).
Beattie et al., "Driving Operational ROI through Collaboration & Conferencing Services: How Sales, Marketing, IT, and HR & Training personnel can be more efficient & productive in today's challenging business environment," Wainhouse Research, LLC, pp. 1-11 (Sep. 2008).
Bennett, Catherine D., "Benchmarking for Improved Decision-Making Capabilities in Today's Public Sector," PERI Benchmarking Series, pp. 1-4 (2004).
Bergamaschi et al., "A Data Integration Framework for E-commerce Product Classification," Proceedings of the First International Semantic Web Conference on The Semantic Web, pp. 379-393 (Jun. 9-12, 2002).
Bobek et al., "Enabling Workflow in UPNP Networks," IEEE International Conference, 166-171 (2005).
Body, Andrew, "The Pace of Change the Role of Research in Uncertain Times," Chief Procurement Officer Summit (An Aberdeen Group Executive Leadership Summit) (Nov. 17, 2009).
Brady et al., "Leadership and politics: a perspective from the Growth Commission," Oxford Review of Economic Policy, 25(2):205-218 (2009).
Brambilla et al., "Asynchronous Web Services Communication Patterns in Business Protocols," Computer Science, 3806:435-442 (2005).
Brooks, Rex, "Connecting the Dots: CAP and WSRP," http://www.idealliance.org/proceedings/xml04/papers/ . . . pp. 1-16 (Dec. 23, 2008).
Bürdek, Bernhard E., "History, Theory and Practice of Product Design," *Design*, Birkhäuser—Publishers for Architecture (2005).
Business Objects, "Business Objects Planning Technical Architecture Version 10," pp. 1-10 (Nov. 2005).
Campbell et al., "Session Initiation Protocol (SIP) Extension for Instant Messaging," *Network Working Group*, The Internet Society, pp. 1-19 (Dec. 2002).
Campbell et al., "The Message Session Relay Protocol (MSRP)," *Network Working Group*, The IETF Trust, pp. 1-64 (Sep. 2007).
Canas et al., "The Network Architecture of Cmap Tools," Technical Report IHMC Cmap Tools, pp. 1-12 (2003).
Cantrell et al., "The Five Essential Practices of a Talent Multiplier," Accenture Research Report, pp. 1-10 (Aug. 2005).
CBDI WebServices Roadmap, "Assembling the Web Service Infrastructure," http://roadmap.cbdiforum.com/reports/infrastructure/stages.php, pp. 1-4 (Dec. 23, 2008).
CBDI WebServices Roadmap, "SOA Fundamentals," http://roadmap.cbdiforum.com, pp. 1-3 (Dec. 23, 2008).
CBDI WebServices Roadmap, "The Web Services Protocol Stack," http://roadmap.cbdiforum.com, pp. 1-7 (Dec. 23, 2008)
CBDI WebServices Roadmap, "Where to Apply Web Services," http://roadmap.cbdiforum.com/reports/applyingws/page2.php, pp. 1-7 (Dec. 23, 2008).
Cerqueira et al., "Q3M: QoS Architecture for Multi-user Mobile Multimedia Sessions in 4G systems," Computer Science, 4787:38-49 (2007).
Cerqueira et al., "QoS Mapping and Adaptation Control for Multi-user Sessions over Heterogeneous Wireless Networks," Mobimedia'07, 8:1-7 (2007).
Cerqueira et al., "QoS Support for Multi-user Sessions in IP-based Next Generation Networks," Mobile Netw Appl., 13:366-384 (2008).
Champion, Tim, "Outsourcing R&D," Cambridge Consultants PowerPoint (2002).
Chappell, David, "Introducing SCA," David Chappell & Associates, pp. 1-22 (Jul. 2007).
Cisco Systems, Inc., "Cisco Data Center Network Architecture and Solutions Overview," pp. 1-19 (2006).
Cisco Systems, Inc., "Cisco Dynamic Flow Control Solution," White Paper, pp. 1-8 (2006).
Cisco Systems, Inc., "Cisco Systems IP Network-Centric Video Surveillance," White Paper, pp. 1-15 (2007).
Cisco Systems, Inc., "Cisco Video Surveillance Integrated Services Platform," Data Sheet, pp. 1-7 (2006).
Cisco Systems, Inc., "IP Multicast Network Management Overview," White Paper, pp. 1-9 (Aug. 2007).
Cisco Systems, Inc., "IP Multicast Technical Overview," White Paper, pp. 1-9 (Aug. 2007).
Cisco Systems, Inc., "Multicast for Mobile Networks," White Paper, pp. 1-14 (2006).
Cisco Systems, Inc., "Next-Generation Federal Data Center Architecture," White Paper, pp. 1-12 (2007).
Cisco Systems, Inc., "Optimizing Video Transport in Your IP Triple Play Network," White Paper, pp. 1-13 (2006).

(56) References Cited

OTHER PUBLICATIONS

Cisco Systems, Inc., "Using Infrastructure Service Orchestration to Enable a Service-Oriented Architecture," White Paper, pp. 1-12 (2007).
Citrix, "Clearly better virtualization with Citrix XenServer™," White Paper, pp. 1-11 (2008).
Citrix, "Making Desktop Virtualization Work," Desktop Delivery Whitepaper, pp. 1-11 (Apr. 2008).
Collins et al., "Algorithms for Cooperative Multisensor Surveillance," Proceedings of the IEEE, 89(10):1456-1477 (2001).
Comin et al., "A New Approach to Measuring Technology with an Application to the Shape of the Diffusion Curves," Version 1, pp. 1-25 (Jun. 5, 2007).
Comin et al., "An Exploration of Technology Diffusion," Harvard Business School Working Paper, pp. 1-47 (Apr. 2008).
Cortada et al., "How rapidly advancing nations can prosper in the Information Age," IBM Global Business Services (2007).
Cortada et al., "How the most advanced nations can remain competitive in the Information Age," IBM Global Business Services (2007).
Cortada et al.,"Government 2020 and the perpetual collaboration mandate," IBM Institute for Business Value, pp. 1-20 (2008).
Crawford et al., "Toward an on demand service-oriented architecture," IBM Systems Journal, 44(1):81-107 (2005).
Cullen, Allen, "Evaluating Your IT Operations Organization: Are you set up to operate efficiently and effectively?" Forrester® Best Practices, pp. 1-6 (2006).
Deloitte, "The natural convergence of business and IT," Tech Trends 2011, pp. 1-68 (2011).
Devoteam Teligent, "Teligent SDP Service Delivery Platform" (Jan. 8, 2009).
Digisoft.tv, "The DigiHost software development kit (SDK)," pp. 1-4 (Aug. 11, 2008).
Ding et al., "GoldenBullet: Automated Classification of Product Data in E-commerce," In Proceedings of BIS 2002, Poznan, Poland (2002).
Dogra et al., "Driving service innovation in communications, high tech and media: The impact of Google's Android platform," Outlook Point of View, 2:1-2 (Feb. 2008).
Dutra et al., "Creating a Corporate Culture that Drives Greater Financial Returns and High Performance," Strategy in Action, Accenture, pp. 1-12 (2007).
Fadden et al., "Fixing what matters: Accounting for organizational priorities when communicating usability problems," Usability Professionals' Association 2003 Conference Proceedings.
Fensel et al., "Product Data Integration in B2B E-commerce," Intelligent Systems, IEEE, 16(4) (2001).
Freund et al., "ESB Interoperability Standards," IBM, pp. 1-17 (Jun. 2, 2008).
Frost & Sullivan, "A High Resolution Breakthrough in Public Safety," White Paper, pp. 1-26 (2009).
Fu et al., "A framework for device capability on demand and virtual device user experience," IBM J. Res. & Dev., 48(5/6):635-648 (Sep./Nov. 2004).
Gallagher et al., "GATMO: a Generalized Approach to Tracking Movable Objects," in IEEE International Conference on Robotics and Automations, pp. 2043-2048 (2009).
Gammage et al., "Gartner's Top Predictions for IT Organizations and Users, 2010 and Beyond: A New Balance," Gartner Research, pp. 1-22 (Dec. 29, 2009).
Garfinkel, Simson, "Kill the Operating System!" Technology Review, http://www.techreview.com/printer_friendly_article.aspx?id=13274 (Sep. 26, 2006).
Gershman, Anatole, "How web services will redefine the service economy," Outlook, 2:40-47 (2002).
Göker, Mehmet H., "Adapting to the Level of Experience of the User in Mixed-Initiative Web Self-Service Applications," Workshop on Mixed-Initiative Case-Based Reasoning, Fifth International Conference on Case-Based Reasoning, pp. 1-10 (Jun. 24, 2003).
Goodwin, Kim, "Designing for the Digital Age: How to create human-centered products and services," Wiley Publishing, Inc., Indianapolis, Indiana, pp. 1-64 (2009).
Gopalakrishnan et al., "CPM: Adaptive Video-on-Demand with Cooperative Peer Assists and Multicast," in IEEE INFOCOM (2009).
Grifantini, Kristina, "Cell Phones that Listen and Learn," http://www.technologyreview.com, pp. 1-3 (Jun. 22, 2009).
Gross et al., "Active Appearance Models with Occlusion," Image and Vision Computing, 24:593-604 (2006).
Gross et al., "Face Recognition Across Pose and Illumination," in Handbook of Face Recognition, Spring-Verlag, pp. 193-216 (2005).
Gross et al., "Generic vs. Person Specific Active Appearance Models," Image and Vision Computing, 23(11):1080-1093 (2005).
Gross et al., "Model-Based Face De-Identification," in Protecting Privacy in Video Surveillance, pp. 129-146 (2009).
Gross et al., "Semi-Supervised Learning of Multi-Factor Models for Face De-Identification," in CVPR Main Conference (Jun. 24, 2008).
www.elexnet.com, "Launch an Application" (2008).
www.elexnet.com, "Understand the Applications Portlet" (2008).
www.elexnet.com, "View Application Documentation" (2008).
www.everware-cbdi.com, "Service Planning, Engagement Process Overview," Everware-CBDI Inc., pp. 1-23 (2008).
www.everware-cbdi.com, "SOA Adoption Roadmap, Engagement Process Overview," Everware-CBDI Inc., pp. 1-30 (2008).
www.everware-cbdi.com, "SOA Governance Framework—Engagement Process Overview" pp. 1-26(2008).
Matthew, Dr. Johny, www.ibm.com, "Get started with WebSphere business process management V6.1 software" pp. 1-8 (2008).
Curtis, Miles, www.ibm.com, "Model and simulate business processes, Part 1:Modeling metrics and KPIs in WebSphere Business Modeler" pp. 1-15 (2007).
Burner, Dell, www.ibm.com, "Replication live: Use the Q Replication Dashboard for real-time monitoring," pp. 1-2 (Mar. 27, 2008).
Perepa, Bahargav, www.ibm.com, "Using SOA with WebSphere Process Integration products: Part 6: Business measures and monitoring" pp. 1-2 (2006).
Mestrallet, Benjamin, www.infoq.com, "An Overview of the eXo Platform" pp. 1-18 (2008).
Gonsalves, Antone, www.informationweek.com, Apple Could Find Healthy Market for $700 Touch-Screen Tablet, (May 21, 2009).
Corbin, Kennth, www.internetnews.com, "Critics Seeking to Debunk Spectrum Scarcity," pp. 1-3 (2009).
Cole, Arthur, www.itbusinessedge.com, Application Virtualization Taking Off—Data Center Central pp. 1-7 (Apr. 18, 2008).
Cole, Arthur, www.itbusinessedge.com, ITBE:The Three Factors Shaping the Future of the Data Center pp. 1-3 (May 4, 2009).
www.microsoft.com/dynamics, Microsoft Dynamics: RoleTailored Business Productivity "Software Designed for Your People," Microsoft Dynamics, pp. 1-56 (Mar. 1, 2007).
www.mobotix.com/.../Ring-Buffer-Storage, "Ring Buffer Storage," MOBOTIX, pp. 1-4 (Jan. 12, 2010).
www.mobotix.com/eng_US/Products, "Cameras," MOBOTIX, pp. 1-2 (Jan. 12, 2010).
www.mobotix.com/eng_US/Products/Software, "MxControlCenter," MOBOTIX, pp. 1-2 (Jan. 12, 2010).
www.mobotix.com/eng_US/References, "Overview: Application Fields for MOBOTIX Cameras," MOBOTIX, pp. 1-4 (Jan. 12, 2010).
www.mobotix.com/eng_US/Support, "MOBOTIX Support and Services," MOBOTIX AG (Jan. 12, 2010).
www.mobotix.com/other/.../Network-Load, "Network Load," MOBOTIX, pp. 1-4 (Jan. 12, 2010).
www.mobotix.com/Produkte/Kamerafunktionen, Mobotix, "Overview: The Technology Behind the MOBOTIX Cameras," pp. 1-5 (Jan. 12, 2010).
Patil, Sunil, www.onjava.com, "What is a Portlet, Part 2" pp. 1-10 (Feb. 1, 2006).
Patil, Sunil, www.onjava.com, "What Is a Portlet" pp. 1-9 (2005).
www.publicservice.co.uk, "Every citizen to get their own Mygov" pp. 1-2 (Mar. 22, 2010).
www.samsung.com, SAMSUNG Hard Disk Drive—learning resource—white papers pp. 1-4 (2008).
www.savvion.com, "Making Business Improvement Real: How People Power the Process," Savvion, Inc., pp. 1-16 (Mar. 2008).

(56) References Cited

OTHER PUBLICATIONS www.subhashnair.com, R&D Outsourcing Gaining Momentum "Product Development in a Flat World" pp. 1-2 (2010).
Greene, Kate, www.technologyreview.com, "What Your Phone Knows About You" pp. 1-2 (Dec. 20, 2007).
Greene, Kate, www.technologyreview.com, Hyperlinking Reality via Phones, pp. 1-3 (2006).
Associated Press, www.technologyreview.com, Technology Review "Intel, Nokia work on new pocket computer project" pp. 1-2 (2009).
Williams, Mark, www.technologyreview.com, Technology Review: Better Face-Recognition Software, pp. 1-4 (May 30, 2007).
www.technologyreview.com, Technology Review: Blogs: TR Editors' blog: Enhancing Video for the Visually Impaired pp. 1-6 (Dec. 11, 2008).
www.technologyreview.com, Technology Review: Digging Deeper in Web Search pp. 1-3 (Jan. 29, 2009).
www.telegraph.co.uk, "Every citizen to have personal webpage" pp. 1-2 (Mar. 20, 2010).
www.theatlantic.com, The Atlantic Online "How the Crash Will Reshape America" pp. 1-12 (Mar. 2009).
www.theatlanitic.com, The Atlantic Online "Where the Brains Are" pp. 1-4 (Oct. 2006).
www.timesonline.co.uk, "Government webpage for every citizen in the race to create a paperless society" (Mar. 20, 2010).
Xia Gao et al., "End-To-End QoS Provisioning in Mobile Heterogeneous Networks," IEEE Wireless Communications, pp. 24-34 (Jun. 2004).
Yang Wang et al., "Non-rigid Face Tracking with Local Appearance Consistency Constraint," The Robotics Institute, Carnegie Mellon University, pp. 1-8 (2008).
Yeonsik Jeong et al., "Cue-based Networking using Wireless Sensor Networks: A Video-over-IP Application," IEEE, pp. 1-9 (2008).
Young J. Won et al., "Measurement of Download and Play and Streaming IPTV Traffic," IEEE Communications Magazine, pp. 154-161 (Oct. 2008).
Young-Hoon Park et al., "An Integrated Model for Whether, Who, When and How Much in Internet Auctions," Cornell University, pp. 1-36 (Feb. 2005).
Zapthink's Service-Oriented Architecture Roadmap 3.0 (2008).
Zhexuan Song et al., "Task Computing for Ubiquitous Multimedia Services," Fujitsu Laboratories of America, Inc., pp. 1-6 (2004).
ZhiQuan Cheng et al., "A QoS Controller for Adaptive Streaming of 3D Triangular Scenes," Edutainment, LNCS 4469, pp. 572-583 (2007).
ZhiQuan Cheng et al., "A Service-Oriented Architecture for Progressive Delivery and Adaptive Rendering of 3D Content," VSMM 2006, LNCS 4270, pp. 110-118 (2006).
International Search Report and Written Opinion from PCT application No. PCT/US2011/000985 issued Feb. 1, 2012 (25 pages).
"FTC Says Internet Ad Self-Regulation Falling Short," http://www.internetnews.com, p. 1 (Nov. 2, 2007).
"Internet Protocol Multicast," In Internetworking Technologies Handbook, Chapter 43, pp. 1-16 (2000).
"IP Multicast Technology Overview," In DIG: Enterprise Campus Topology, pp. 1-24 (2000).
"Solution Transport Architecture," In: Cisco Wireline Video/IPTV Solution Design and Implementation Guide, Release 1.1, Chapter 3 (2006).
"VoIP Goes to College," ITBusinessEdge, p. 1 (Apr. 24, 2009).
"What's Not to Like About Behavioral Targeting?" http://www.emarketer.com, pp. 1-3 (Jun. 30, 2008).
2030 Water Resources Group, "Charting Our Water Future: Economic frameworks to inform decision-making," http://www.mckinsey.com/App_Media/Reports/Water/Charting_Our_Water_Future_Full_Report_001.pdf, pp. 1-198 (2009).
Cohen, Heidi, "Digital Communications: It's Not Just E-Mail Anymore," Omniture, pp. 1-4 (Mar. 9, 2009).
Continental Automated Buildings Association, "Designing the Future of Information," Information Series, p. 1-35 (Feb. 2006).
Eatmon et al., "XEP-0004: Data Forms," http://xmpp.org/extensions/xep.0004.html, pp. 1-19 (Jun. 29, 2010).
Economist.com, "You're hired," Science Technology Quarterly, http://www.economist.com/science/tq/PrinterFriendly.cfm?Story_ID=3171466, pp. 1-3 (Nov. 15, 2004).
Gansler, Jacques S., "Achieving Dominant Battlespace Awareness Through Advanced Information Technology," http://www.au.af.mil/au/awc/awcgate/dod/gansler.html pp. 1-4 (Feb. 16, 2010).
Hobfeld et al., "A qualitative Measurement Survey of Popular Internet-based IPTV Systems," in Second International Conference on Communications and Electronics (HUT-ICCE 2008), Hoi An, Vietnam (2008).
IBM Consulting Services, "Business Activity Monitoring with WebSphere Business Monitor V6.1," Redbooks (May 2008).
IBM Corporation, "The Enterprise of the Future," Global CEO Study (2008).
Ludwig et al., "XEP-0166: Jingle," http://xmpp.org/extensions/xep-0166.html, pp. 1-43 (Jun. 29, 2010).
Muldowney, Thomas, "XEP-0027: Current Jabber OpenPGP Usage," http://xmpp.org/extensions/exep-0027.html, pp. 1-7 (Jun. 29, 2010).
Paterson et al., "XEP-0124: Bidirectional-streams Over Synchronous HTTP (BOSH)," http://xmpp.org/extensions/xep-0124.html, pp. 1-34 (Jun. 29, 2010).
Saint-Andre, P. "XEP-0001:XMPP Extension Protocols," http://xmpp.org/extensions/xep-0001.html, pp. 1-24 (Jun. 29, 2010).
Socher, Larry, "Managing the Digital Home," Accenture, pp. 1-11 (2008).
Weinreich et al., "A Component Model for Integrating Remote Applications and Services via Web Portals," Journal of Object Technology, 6(8):67-94 (Sep.-Oct. 2007).
Nikon—Snap7, Jul. 1, 2009.
Nikon Coolpix Wi-Fi Service, Jul. 1, 2009.
Nikon Snap6, COOLPIX Digital Cameras, Jul. 1, 2009.
Nikon, "Camera Control Pro 2 Reference Manual," pp. 1-106, Jul. 1, 2009.
Nikon, "Wireless Networking with Nikon Cameras," Nikon, Inc. pp. 1-22, Jul. 1, 2009.
Nikon, COOLPIX S610c Digital Camera Specifications, Nikon, Inc., pp. 1-2, Jul. 1, 2009.
www.aplabs.com, AP Labs, "DVE-201 Digital Video Engine", Sep. 22, 2008.
A. Arsanjani et al., "SOMA: A method for developing service-oriented solutions," IBM Systems Journal 47-3:1-20 (2008).
Ali Arsanjani et al., "Design an SOA solution using a reference architecture," IBM, pp. 1-16 (Mar. 28, 2007).
Ali Arsanjani, Ph.D., "Service-oriented modeling and architecture," IBM, pp. 1-10 (Nov. 9, 2004).
Amy Newman et al., "What to Expect With Virtualization," An Internet.com Networking eBook, pp. 1-20 (2008).
Ann Fred et al., "The case for portlets," IBM, pp. 1-7 (Feb. 1, 2003).
Barbara McKee et al., "Introducing IBM WebSphere Service Registry and Repository, Part 2: Architecture, APIs, and content," IBM, pp. 1-8 (Sep. 29, 2006).
C.H.Crawford et al., "Toward an on demand service-oriented architecture," IBM SYSTEMS JOURNAL, 44(1):81-107 (2005).
ClickZ Experts, Web 2.0 Is Just So 2008 pp. 2-4 (Mar. 9, 2009).
Ekow Nelson et al., "IBM Institute for Business Value: Telco 2015," IBM Global Business Services, pp. 1-34 (2010).
Fred von Lohmann, "Updated: All Your Apps Are Belong to Apple: The iPhone Developer Program License Agreement," Electronic Frontier Foundation, pp. 1-2 (Mar. 9, 2010).
Glen Kunene et al., "The Developer's Guide to Virtual Machines," An Internet.com Developer eBook, pp. 1-20 (2006).
Harvard Business Publishing, "The Daily Stat: The Most Finicky Devices," Pew Research Center, pp. 1-2 (Jan. 30, 2009).
Henry Dao et al., "Rewiring for global integration: Connecting the electronics value chain with SOA," IBM Global Business Services, pp. 1-18 (2008).
IBM, "Access Integration," IBM, pp. 1-2 (2008).
IBM, "Access Integration: Client Application Patterns," IBM, pp. 1-9 (2008).

(56) References Cited

OTHER PUBLICATIONS

IBM, "Access Integration: Select Application pattern," IBM, pp. 1-4 (2008).
IBM, Account Access, IBM, pp. 1-2 (2008).
IBM, "Application Integration," IBM, pp. 1-3 (2008).
IBM, "Application Integration: Select Application pattern," IBM, pp. 1-21 (2008).
IBM, "Collaboration," IBM, pp. 1-2 (2008).
IBM, "Collaboration: Review Application patterns," IBM, pp. 1-8 (2008).
IBM, "Custom design: Select a Non-Functional Requirement," IBM, pp. 1-3 (2008).
IBM, "Electronic Commerce," IBM, pp. 1-2 (2008).
IBM, "Electronic Commerce::Select Application pattern," IBM, pp. 1-3 (2008).
IBM, "e-Marketplace composite pattern: Select Application pattern," IBM, pp. 1-5 (2008).
IBM, "e-Marketplace composite pattern:: Sell-Side Hub variation," IBM, pp. 1-5 (2008).
IBM, "e-Marketplace," IBM, pp. 1-3 (2008).
IBM, "Extended Enterprise," IBM, pp. 1-3 (2008).
IBM, "Extended Enterprise: Select Application pattern," IBM, pp. 1-10 (2008).
IBM, "Information Aggregation," IBM, pp. 1-2 (2008).
IBM, "Information Aggregation: Select Application pattern," IBM, pp. 1-5 (2008).
IBM, "Integrating the Self-Service and Collaboration patterns using WebSphere and Domino," IBM, pp. 1-2 (2008).
IBM, "Non-Functional Requirements," IBM (2008).
IBM, "Pervasive Commerce Portal," IBM, pp. 1-2 (2008).
IBM, "Portal," IBM, pp. 1-2 (2008).
IBM, "Portal: Select Application pattern," IBM, pp. 1-9 (2008).
IBM, "Satisfy consumer demand for self-service and reap the benefits of self checkout," IBMCorporation, pp. 1-8 (2004).
IBM, "Select a Business/Integration/Composite pattern, or a Custom design," IBM, pp. 1-2 (2008) http://www.ibm.com/developerworks/patterns.
IBM, "Self-Service," IBM, pp. 1-4 (2008).
IBM, "Self-Service: Select Application pattern," IBM, pp. 1-12 (2008).
IBM, "Service Component Architecture," IBM, pp. 1-2 (Nov. 30, 2005) http://www.ibm.com/developerworks/library.
IBM, "WebSphere Portal Family wiki: 1.0 Architecture for direct debit applications on the Internet," IBM, pp. 1-3 (2008) http://www-10.1otus.com/ldd/portalwiki.nsf/dx/1.0-architecture-for-direct-debit.
IBM, "WebSphere® Portal Product overview," IBM, pp. 1-7 (2008) http://www.skywayradio.com/tech/WAS51/portal.
Jean Wang, "Develop SOA solutions for healthcare organizations using business-driven development," IBM, pp. 1-15 (Sep. 15, 2006).
Jeffrey M. Bradshaw et al., "Toward Semantically-Rich Policy Representation: Issues and Applications," IHMC, pp. 1-29.
Josh Lerner, "The Litigation of Financial Innovations," Harvard Business School, pp. 1-42 (2008).
Jyotirmaya Nanda et al., "A Methodology for Product Family Ontology Development Using Formal Concept Analysis and Web Ontology Language," Journal of Computing and Information Science in Engineering, 6:103-113 (Jun. 2006).
Karl Ricanek Jr., "Dissecting the Human Identity," IEEE:COMPUTER, pp. 96-97 (Jan. 2011).
Kate Greene, "A Powerful Way to Edit Images Online," Technology Review, pp. 1-3 (May 8, 2009).
Martin Keen et al., "Patterns: Implementing an SOA Using an Enterprise Service Bus," IBM—Redbooks, pp. 1-368 (Jul. 2004).
Marty Foltyn et al., "Developing an Information Lifecycle Management Strategy," an Internet.com Storage eBook, pp. 1-10 (2006).
Michael Healey et al., "Telepresence: Living Like the Jetsons," InformationWeek, pp. 1-15 (Jan. 2010).
Olivier Chatain et al., "Value Creation and Value Capture with Frictions," Social Science Research Network, pp. 1-43 (Jun. 16, 2009) http://ssrn.com/abstract.
Pamela Seiple, "Top 7 B2B Case Studies for 2010: Practical and proven marketing strategies and tactics on SEO, content, lead generation, sales conversion, and ROI," MarketingSherpa LLC, pp. 1-64 (2010).
Sanjeev Nagrath et al., "The Smarter Supply Chain of the Future," IBM, pp. 1-66 (2009).
Sharon Greene et al., "A User Centered Design Approach to Tools for Policy," IBM (Apr. 2004).
UTRA-UTRAN Long Term Evolution (LTE) and 3GPP System Architecture Evolution (SAE), pp. 1-8 (2006).
www.3dvsystems.com, 3 DV Systems—Chip for Depth-Sensing Cameras.
www.cioinsight.com, "Technology: Predictive Analytics Lets Companies See into the Future" pp. 1-4 (2006).
Ian Davis, "What is the business of business?" The McKinsey Quarterly, pp. 105-113 (2005).
Aberdeen Group, "Beyond Spreadsheets: The Value of BI and Analytics," Analyst Insight, pp. 1 -6 (Jan. 2009).
Aberdeen Group, "Panorama Ups the 'Self-Service Ante' with Latest Release of Analytics for Google Does," Market Alert, pp. 1-4 (Sep. 2008).
Brugnoli, Gianluca, "How will Google Chrome change the user experience on the web?" CNET Networks, http://news.cnet.com/8301-13641_3-10033549-44.html?tag=n1.e432, pp. 1-5 (Sep. 6, 2008).
IBM Institute for Business Value, "The path forward," The 2009 Global CRM Leaders Study, Executive Report, pp. 1-20 (2009).
Sehgal et al., "The Elusive Right Path to Engineering Offshoring business.com," http://www.strategy-business.com, pp. 1-4 (Jan. 11, 2010).
Abhijit Dubey et al., "Delivering software as a service," The McKinsey Quarterly, pp. 1-12 (May 2007).
Art Kleiner, "Thought Leader: Erik Brynjolfsson," strategy+business, 58:1-11 (2010).
Bobby Woolf, "Comment lines: Bobby Woolf: A quick intro to WebSphere Business Process Management," IBM, pp. 1-7 (Feb. 22, 2006).
Bojan Simic, "The Value of Network and Application Visibility: Improving the Usability of Performance Data," www.aberdeen.com, Aberdeen Group pp. 1-22 (2008).
Christopher E. Kondracki, Letter dtd. Sep. 16, 2008 re: World Windows/aka "Max", pp. 1-455.
Christopher K. Hsee et al., "Wealth, Warmth and Wellbeing: Whether Happiness Is Relative or Absolute Depends on Whether It Is About Money, Acquisition or Consumption," Journal of Marketing Research, vol. XLV:1-46 (2008).
David Hatch, "Smart Decisions: The Role of Key Performance Indicators," Aberdeen Group, pp. 1-20 (Sep. 2007) www.aberdeen.com.
David Houlihan, "The Technical Communicator's Transformation: Publishing On-Time and On-Quality," Aberdeen Group, pp. 1-27 (Oct. 2008) www.aberdeen.com.
David Rock, "Managing with the Brain in Mind," strategy+business, pp. 1-12 (2009).
Giancarlo Ghislarizoni et al., "The multilocal challenge: Managing cross-border functions," The McKinsey & Company, McKinsey Quarterly, pp. 1-10 (Mar. 2008).
James Manyika et al., "Big data: The next frontier for innovation, competition, and productivity," McKinsey Global Institute, pp. 1-156 (May 2011).
James Manyika et al., "Growth and renewal in the United States: Retooling America's economic engine," McKinsey Global Institute, pp. 1-78 (Feb. 2011).
James Manyika et al., "How to compete and grow: A sector guide to policy," McKinsey Global Institute, pp. 1-54 (Mar. 2010).
Jeffrey Wadsworth, "2010 Global R&D Funding Forecast," R&D Magazine, pp. 1-36 (Dec. 2009) www.rdmag.com.
Joanna Barsh et al., "Leadership and innovation," The McKinsey Quarterly, pp. 37-47 (2008).

(56) References Cited

OTHER PUBLICATIONS

Lenny Mendonca et al., "Changing the fortunes of America's workforce: A human capital challenge," McKinsey Global Institute, pp. 1-83 (Jun. 2009).
Matt Anderson et al., "The M-commerce Challenge: As smartphones change shopping, retailers face a stark choice: Fall in behind their newly enabled consumers or fall behind altogether," strategy+business, pp. 1-5 (Nov. 29, 2010).
Matthieu Pelissie du Rausas et al., "Internet matters: The Net's sweeping impact on growth, jobs, and prosperity," McKinsey Global Institute, pp. 1-70 (May 2011).
McKinsey Global Survey Results: Creating organizational transformations, pp. 1-7 (Jul. 2008).
Nikon, "CoolPix S610/S610c User's Manual," Nikon Corporation pp. 1-151 (2008).
Peter Ostrow "Marketing Automation 101: Ensuring Early Success with the Basics, Maturing Your Deployment for Long-Term ROI," Aberdeen Group, pp. 1-7 (Jun. 2010) www.aberdeen.com.
Sheila Bonini et al., "From risk to opportunity: How global executives view sociopolitical issues," The McKinsey Quarterly, pp. 1-12 (Sep. 2008).
Sony Cyber-shot Handbook, Sony Corporation, pp. 1-178 (2008).
www.aberdeen.com "Predictive Analytics: The BI Crystal Ball," AberdeenGroup, pp. 1-26 (May 2008).
www.aberdeen.com, "Integrating the PLM Ecosystem," AberdeenGroup, pp. 1-28 (Apr. 2008).
www.sony.com/G3wifi, Sony Cyber-shot Wi-Fi access, Sony Corporation, pp. 1-2 (2008).
Zoe Baird et al., "Implementing a Trusted Information Sharing Environment," Markle Foundation, pp. 1-12 (Feb. 2006) www.markle.org.
Erica Naone, "The Year in Software," Technology Review, pp. 1-2 (Jan. 2, 2008).
"Making Business Intelligence Easy," Yellowfin International Pty Ltd., pp. 1-13 (Sep. 2010).
"Real Answers—The Global Data Synchronization Challenge for Small Businesses," GXS, pp. 1-14 (2005) www.gxs.com.
"Seven Key Requirements for Personalized Recommendation Services," ChoiceStream, Inc., pp. 1-14 (2009).
"So you want to be a VoIP Telephone Company?" Telcentris, Inc., www.telcentris.com pp. 1-14 (2006).
"Virtualization everywhere," Citrix, www.citrix.com pp. 1-8 (2008).
Abdelhamid Nafaa et al., "Analysis of a Large-Scale VOD Architecture for Broadband Operators: A P2P-Based Solution," IEEE Communications Magazine, pp. 47-55 (Dec. 2008).
Adrian Mello, "Product Development Best Practices: Electronics & High Tech," Electronic Business, PTC.com, pp. 1-40 (2005) www.ptc.com/go/bpreport.
Alan Ganek, "Managing the Human-Computer Partnership with Autonomic Computing," IBM Corporation, pp. 1-11 (Apr. 21, 2004).
Alberto J. Canas et al., "The Network Architecture of CmapTools," Technical Report IHMC CmapTools 93-02, pp. 1-12 (2003).
Alexander Kandybin et al., "The Promise of In-market Innovation," strategy+business, pp. 1-4 (Jun. 2, 2009).
Alice J. O'Toole et al., "Fusing Face Verification Algorithms and Humans," IEEE, pp. 1-7 (2006).
Alla Segal et al., "Human-Computer Interfaces for Utility Functions," IBM, pp. 1-10 (Apr. 2004).
Amanda Mahan, "Clorox App Gives Consumers Content They Want," eMarketer Inc., pp. 1-3 (Mar. 5, 2010).
Andreas Schonberger et al., "Realising RosettaNet PIP Compositions as Web Service Orchestrations—A Case Study," Distributed and Mobile Systems Group, pp. 1-7.
Andy Patrizio, "A Web Server That Will Fit in Your Pocket," internetnews.com, pp. 1-2 (May 21, 2009).
Angelo Morelli, "Service Delivery Platform 2.0: The Next Generation of High Performance," Accenture, pp. 1-8 (2008).
Ann All, "Platform-as-a-Service Even More Disruptive than SaaS; SMBs Likely to Lead Adoption," ITBUSINESSEDGE, pp. 1-7 (Apr. 15, 2008).
Arnoud De Meyer et al., "How to optimize knowledge sharing in a factory network," McKinsey Quarterly, pp. 1-7 (Sep. 2009).
Aron Gombas, "Kosmos Reference Manual," jboss.org, pp. 1-23 (2005) www.jboss.com/kosmos/reference-maual.html.
Associated Press, "ND telepharmacy project expands across country," Technology Review, pp. 1-4 (Sep. 12, 2008).
Associated Press, "Travelers share experiences through online guides, providing alternative to printed guidebooks," Technology Review, pp. 1-4 (Dec. 19, 2006).
Atanu Banerjee, "Architectural Considerations for a World of Devices," Microsoft Corporation, pp. 1-14 (2008).
Bei San huan Xi Lu, "DevSuite-Knowledge-centric Application Lifecycle Management," TechExcel, pp. 1-5.
Beichuan Zhang et al., "Universal IP multicast delivery," Science Direct, Computer Networks, 50:781-806 (2006).
Ben Leach, "India to issue all 1.2 billion citizens with biometric ID cards," Telegraph Media Group Ltd., pp. 1-2 (Jul. 15, 2009) http://www.telegraph.co.uk/news/worldnews/asia/india/5831929.
Bernard Marr, "Measuring and benchmarking intellectual capital," Benchmarking: An International Journal, 11(6):559-570 (2004) www.emeraldinsight.com/1463-5771.htm.
Beth Schreiber, "An Integrated Solutions Console for the IBM Integrated Runtime," IBM Corporation, pp. 1-8 (2004).
Bill Sharpe, "The new knowledge environment," The ApplianceStudio Ltd., pp. 1-36 (2002).
Carla O'Dell, "Measuring the Impact of Knowledge Management," American Productivity & Quality Center, pp. 1-29 (2004).
Carlos Molina-Jimenez et al., "On State Synchronization of Business Conversations," University of Newcastle, UK, pp. 1-4 (2006).
Chloe Barzey et al., "Supply Chain Management, Viewpoint," Accenture, pp. 1-12 (2007) www.accenture.com.
Chris Anderson, "The End of Theory: The Data Deluge Makes the Scientific Method Obsolete," Wired Magazine, 16.07, pp. 1-3 (Jun. 23, 2008).
Chris Crum, "Will Google Eliminate the Need for Small Business Websites?" WebPro News, pp. 1-13 (Sep. 29, 2009) http://www.webpronews.com/topnews/2009/09/28/google-local.
Chris Finden-Browne, "An Approach to Estimating the Productivity Impact of Autonomic Computing Improvement Initiatives," IBM Global Services, pp. 1-13 (Apr. 21, 2004).
Chris Nadherny, "The Multichannel Leadership Challenge, Identifying the right talent for a company's e-evolution," SpencerStuart, pp. 1-16 (2009) www.spencerstuart.com.
Christopher K. Hsee et al., "Two Recommendations on the Pursuit of Happiness," Journal of Legal Studies, 37:S115-S132 (Jun. 2008).
Christopher K. Hsee et al., "When Is More Better? On the Relationship Between Magnitude and Subjective Value," CDIR 371, 14:234-237 (2005).
Christopher K. Hsee et al., "Will Products Look More Attractive When Presented Separately or Together?" The Journal of Consumer Research, 25:175-186 (Sep. 1998).
Christopher K. Hsee, "Less Is Better: When Low-value Options Are Valued More Highly than High-value Options," Journal of Behavioral Decision Making, 11:107-121 (1998).
Cisco, "Quality of Service," Business Ready Teleworker Design Guide, Chapter 4, pp. 4-8-4-12.
D. Hinckley, "Another big loss for free-TV sports," NY Daily News (Nov. 19, 2008).
Dan Farber, "Web 2.5: The emergence of platforms-as-a-service," CNET News.com, pp. 1-7 (Apr. 7, 2008).
Daron Acemoglu et al., "Bayesian Learning in Social Networks*" MIT, pp. 1-57 (Jan. 14, 2010).
David Cannon "Good to great: transform your IT through service lifecycle management," Hewlett-Packard Development Company, L.P., pp. 1-12 (2007).
David Court et al., "Capturing the world's emerging middle class," McKinsey Quarterly, pp. 1-6 (Jul. 2010).
David P. Anderson et al., "The Worldwide Computer," Scientific American, http://lass.cs.umass.edu pp. 1-6 (2008).
David Talbot, "How to Plan for Climate Change," Technology Review, pp. 1-2 (Apr. 15, 2008).

(56) References Cited

OTHER PUBLICATIONS

David Weinberger, "The Year of Scale," Harvard Business Online's Conversation Starter, pp. 1-4 (Dec. 26, 2007) http://conversationstarter.hbsp.com/2007/12/the_year_of_scale_1.
David Y. Smith, "Determining the ROI of Your Learning Programs," Accenture, pp. 1-3 (Jul. 21, 2003).
Dennis Drogseth, "HP's Business Technology Optimization Software for Operations: A Structural Approach to Service Lifecycle Management," Enterprise Management Associates, pp. 1-15 (Apr. 2008).
Dennis Hissink, "Photokina report," Nikon Coolpix S610c, pp. 1-5 (Sep. 2008) www.photokina-show.com/0561/nikon/digitalcamera.
Diana Farrell et al., "Sizing the emerging global labor market," The McKinsey Quarterly, pp. 93-103 (2005).
Diego Comin, "Total Factor Productivity*," New York University, pp. 1-5(Aug. 2006).
Dominic Widdows et al., "The Civium World Model, Spatial and Semantic Issues in Pervasive Computing," MAYA Design, Inc. pp. 1-21(Jun. 15, 2007).
Dr. John J. Sviokla, "SIM Boston Layers: Our Social Media Future," Diamond Management & Technology Consultants, Inc., pp. 1-32 (Sep. 2010).
Dr. Ralf Hinkel, "MOBOTIX—The HiRes Video Company," MOBOTIX AG, pp. 1-3 (Jan. 12, 2010).
Dragomir Anguelov et al., "Google Street View: Capturing the World at Street Level," IEEE:Computer, pp. 32-38 (Jun. 2010).
Drew Robb et al., "Implementing Service Level Management with ITIL," An Internet.com IT Management eBook, pp. 1-18 (2007).
Edd Dumbill, "XML Watch: Desktop XML messaging with Dashboard," IBM, pp. 1-6 (Sep. 17, 2003).
Edgar L. Mounib et al., "SOA for health plans: New connections for new business models," IBM Global Business Services, pp. 1-22 (2008).
Ekaterina H. Spriggs et al., "Temporal Segmentation and Activity Classification from First-person Sensing," Carnegie Mellon University, pp. 1-8 (Jan. 1, 2009).
Elizabeth West, "Rapid E-Learning: Maturing Technology Brings Balance and Possibilities," Adobe Whitepaper, pp. 1-4 (2007).
EMA, "Best Practices in Lifecycle Management: Comparing KACE, Altiris, LANDesk, and Microsoft SMS," Enterprise Management Associates, pp. 1-7 (Jan. 2007).
eMarketer, "Branded Virtual Goods Revenues to Skyrocket," eMarketer Inc., pp. 1-2 (Aug. 19, 2010).
eMarketer, "Consumers Demand Engagement," eMarketer Inc., pp. 1-2 (Jan. 29, 2010).
eMarketer, "How Should Marketers Address Concerns About Ad Targeting?" eMarketer Inc., pp. 1-2 (Feb. 16, 2010) http://www.emarketer.com/Articles/Print.
eMarketer, "The Controversy over Personalized Ads," eMarketer Inc., pp. 1-3 (Jun. 25, 2009).
eMarketer, "Three-Quarters of the World's Messages Sent by Mobile," eMarketer Inc., pp. 1-2 (Mar. 24, 2009).
eMarketer, "Web Users Welcome Brands to Social Games," eMarketer Inc., pp. 1-2 (Jun. 23, 2011) www.emarketer.com/Articles/Print.aspx?
eMarketer, "What Do Shoppers Research on the Web?" eMarketer Inc., pp. 1-2 (Oct. 13, 2008).
Emily Gould, "It's Not a Revolution if Nobody Loses," Technology Review, pp. 1-4 (Sep./Oct. 2008) http://www.technologyreview.com/printer_friendly_article.aspx?
Emily Gould, "iTube," Technology Review, pp. 1-6 (Nov./Dec. 2008).
Eric von Hippel, "Democratizing Innovation," The MIT Press (2005) http://mitpress.mit.edu pp. 1-204 (2005).
Eric von Hippel, "The Sources of Innovation," Oxford University Press, pp. 1-218 (1988).
Erica Naone, "Semantic Delivery," Technology Review, pp. 1-2 (Jan. 23, 2009).
Erica Naone, "Unmasking Social-Network Users," Technology Review, pp. 1-3 (May 6, 2009).
France Leclerc et al., "Narrow Focusing: Why the Relative Position of a Good in Its Category Matters More Than It Should," Marketing Science, 24(2):194-205 (2005).
Franz Leberl et al., "Aerial Computer Vision for a 3D Virtual Habitat," IEEE:COMPUTER, pp. 24-31 (Jun. 2010).
Hal Varian, "Hal Varian on how the Web challeges managers," McKinsey Quarterly, pp. 1-6 (Jan. 2009).
Heather L. McQuaid et al., "When You Can't Talk to Customers: Using Storyboards and Narratives to Elicit Empathy for Users," DPPI, pp. 120-125 (2003).
Henry Schneiderman, "Feature-Centric Evaluation for Efficient Cascaded Object Detection," IEEE Conference on CVPR, pp. 1-8 (2004).
http://12.46.245.173, "What is the Favorites portlet?" (2008).
http://abcnews.go.com, "Study Finds Videoconferences Distort Decisions" (2009).
http://ajaxpatterns.org, "Portlet" pp. 1-5 (2008).
http://developers.sun.com, "Open-Source Portal Initiative at Sun, Part 4: Web Services for Remote Portlets," pp. 1-7 (Dec. 23, 2008).
http://docs.sun.com, WDK Functionality and Architecture, pp. 1-2 (2008).
http://en.wikipedia.org, "Augmented reality," Wikipedia, pp. 1-9 (2009).
http://en.wikipedia.org, "JavaServer Pages," Wikipedia pp. 1-9 (2008).
http://en.wikipedia.org, "Portlet," Wikipedia.
http://en.wikipedia.org, "Windows Presentation Foundation," Wikipedia, pp. 1-10 (2008).
http://en.wikipedia.org, "Zero configuration networking," Wikipedia, pp. 1-6 (2010).
http://epic.org/privacy/surveillance/spotlight/1105/default.html, "Spotlight on Surveillance," Electronic Privacy Information Center, pp. 1-7 (Nov. 2005).
http://in.sys-con.com, SOA Book Excerpt: A Methodology for Service Modeling and Design—Part 1 pp. 1-3 (2008).
http://knowledge.wharton.upenn, Want to Rent out That Spare Room? The Growing Popularity of 'Collaborative Consumption' pp. 1-3 (Aug. 25, 2011).
http://knowledge.wharton.upenn.edu, "How a Little 'Friction' Can Change a Competitive Landscape" pp. 1-3 (2009).
http://knowledge.wharton.upenn.edu, Value Destruction: The Cost to Companies That Engage in Deceptive Marketing pp. 1-4 (Sep. 30, 2009).
http://new.cnet.com, Turning the TV into a 'social-media center' pp. 1-4 (Jun. 11, 2008).
http://news.cnet.com, "It's been 10 years: Why won't people pay for privacy?" pp. 1-5 (Jan. 28, 2010).
http://news.cnet.com, "Greasemonkey goes VideoSurfing" pp. 1-2 (2008).
http://news.cnet.com, "Privacy is not dead, says SXSWi keynoter Boyd" pp. 1-5 (2010).
http://news.cnet.com, "Why no one cares about privacy anymore" pp. 1-6 (Mar. 12, 2010).
http://news.cnet.com, "Why people really do care about privacy" pp. 1-6 (Mar. 13, 2010).
http://news.com.com, Want to 'converse' with advertisers? Me neither pp. 1-5 (Sep. 12, 2007).
http://portlets.blogspot.com/, JSR 168 286 Portlets & Portal, pp. 1-6 (2008).
http://sourceforge.net, SourceForge.net: Portlet Open Source Trading site(POST) (2008).
http://spagobi-info.eng.it, SpagoBI—Architecture, pp. 1-2 (2008).
http://uanews.org, "UA Working to Create a Bilingual, Bicultural 'Roboceptionist'" pp. 1-3 (2010).
http://widemile.wordpress.com/2008/01/28/why-google-optimizer-is-slow , Google Optimizer is slow (or Not all Multivariate Testing is the same), Widemile, pp. 1-6 (Jan. 28, 2008).
http://wikis.sun.com, "Designing and Coding Your Unified Messaging Application," pp. 1-10 (2008).
http://wikis.sun.com, "Unified Messaging Technology," pp. 1-6 (2008).
http://www.acrohealth.org/cro-market.php, "The CRO Market," ACRO, pp. 1-3 (Jan. 12, 2010).

(56) References Cited

OTHER PUBLICATIONS http://www.acrohealth.org/industry-ataglance.php, "CRO Industry at a Glance," ACRO, pp. 1-2 (Jan. 12, 2010).
http://www.acrohealth.org/trends.php, "Trends in Clinical Research," ACRO, pp. 1-2 (Jan. 12, 2010).
http://www.face-rec.org, Face Recognition Homepage—General Info, pp. 1-2 (Jan. 18, 2007).
http://www.11id.com/pages/116-face, "Face Solutions,"L-1 Identity Solutions, pp. 1-3 (2010).
http://www.mobotix.com/eng_US, "Welcome to MOBOTIX—The HiRes Video Company," MOBOTIX AG, pp. 1-3 (Jan. 12, 2010).
http://www.sonicsoftware.com/products/sonic_esb/ "ESB Architecture & Lifecycle Definition," Progress Sonic, pp. 1-5 (2008).
http://www.welie.com/patterns "Pattern library," Welie.com, pp. 1-3 (2008).
https://www.ohloh.net/p/4701, "OpenPortal," Ohloh Analysis Summary, pp. 1-5 (Nov. 11, 2008).
IBM, "BA71: WebSphere Business Monitor—Human Task Monitoring," IBM Corp., pp. 1-2 (Jun. 29, 2007) http://www-1.ibm.com/support/docview.wss?
IBM, "Human Task Monitoring SupportPac," IBM Corp., (2005, 2007) http://publib.boulder.ibm.com/infocenter/dmndhelp.
IBM, "Introduction: Portlet applications," IBM (Dec. 4, 2008) http://publib.boulder.ibm.com/infocenter/wasinfo/v7r0/index.jsp?topic=/com.ibm.websphere.express.doc/info/exp/ae/welc6tech_port_intro.html.
Ingrid Mulder et al., "Designing with Care: The Future of Pervasive Healthcare," PERVASIVE Computing, IEEE CS, pp. 85-88 (Oct.-Dec. 2009) www.computer.org/pervasive.
Jacques Bughin et al., "Clouds, big data, and smart assets: Ten tech-enabled business trends to watch," McKinsey Quarterly, pp. 1-14 (Aug. 2010).
Jaime Teevan et al., "Personalizing Search via Automated Analysis of Interests and Activities," ACM, pp. 1-8 (2005).
Jane C. Linder, "Paying the Price for Engaged Learning," Accenture, pp. 1-11 (Mar. 2000).
Janna Anderson et al., "The Future of the Internet IV: Experts and stakeholders discuss predictions about the future of the internet," Pew Internet & American Life Project, pp. 1-74 (Feb. 2010) www.pewinternet.org/Reports/2010/Future-of-the-Internet-IV.apsx.
Jeanette Caspersen et al., "Making connections: Using SOA to enable collaboration in travel and transportion," IBM Global Business Services, pp. 1-18 (2008).
Jenifer Tidwell, "COMMON GROUND: A Pattern Language for Human-Computer Interface Design," MIT, pp. 1-72 (1999).
Jiao Zhang et al., "The majority rule in individual decision making," Science Direct, Organizational Behavior and Human Decision Processes xxx (2005) xxx-xxx, pp. 1-10 (Oct. 6, 2003).
Joe Hernick et al."The State of Virtualization," InformationWeek, pp. 1-18 (Oct. 31, 2008).
John B. Horrigan, "A Typology of Information and Communication Technology Users," Pew Internet & American Life Project, pp. 1-55 (May 7, 2007).
"Realizing the Sense in Sense & Respond," Systems Modernization and Sustainment Center (SMS) at Rochester Institute of Technology (RIT), pp. 1-4 (2006).
"SOA Performance, Scaling SOA Implementations Now and Into the Future," ZapThink, LLC, pp. 1-15 (Aug. 2008) www.zapthink.com.
"The Business Benefits of Software-as-a-Service: Making the Most of the On-Demand Advantage," NETSUITE, pp. 1-18 (Sep. 2007) www.netsuite.com.
"Workbook: Small Web Site Investments That Pay Off: Seven "Quick Win" Web Site Improvements," OMNITURE, Inc., pp. 1-12 www.omniture.com.
Aaron B. Brown, "Assessing Progress in Mixed Human-Autonomic Systems," IBM (Apr. 2004).
Benjamin F. Jones et al., "Do Leaders Matter?* National Leadership and Growth since World War II," Northwestern University, pp. 1-57 (Mar. 2004).
Christopher K. Hsee et al., "Sun and Water: On a Modulus-Based Measurement of Happiness," Emotion 7:213-218 (2007).
Craig Lambert, "The Science of Happiness," Harvard Magazine, pp. 26-31 (Jan.-Feb. 2007).
Customer Satisfaction Report, IANS, EUROCONTROL, pp. 1-16 (2006).
Daniel Fleder et al., "Recommender Systems and their Effects on Consumers: The Fragmentation Debate," The Wharton School of the University of Pennsylvania, Net Institute Working Paper 08-44, Abstract pp. 1-42 (Mar. 3, 2010), http://ssrn.com/abstract.
Deborah Fallows, "Search Engine Users: Internet searchers are confident, satisfied and trusting—but they are also unaware and naïve," Pew Internet & American Life Project, pp. 1-29 (Jan. 23, 2005) www.pewinternet.org.
Diego Comin et al., "Lobbies and Technology Diffusion*" Review of Economics and Statistics 91(2):1-37 (Oct. 2007).
Diego Comin et al., "Was the Wealth of Nations Determined in 1000 B.C.?*," Harvard Business School, Working Paper 09-052, pp. 1-66 (Sep. 2008).
Diego Comin et al., "World Technology Usage Lags," New York University and NBER, pp. 1-26 (Apr. 2007).
Florian Leser et al., "Implementing Collaborative Process Management—the Case of Net-Tech," International Journal of Cases on Electronic Commerce, 1(4):1-37 (2005).
Frederick M. Hess, "Educational "Innovation" v. Educational Innovation," American Enterprise Institute, pp. 1-7.
George Thomas, "EGov Institute / EA 2007 / PGFSOA / Tutorial," U.S. General Services Administration, pp. 1-26 (Sep. 7, 2007).
Glen L. Urban et al., "Listening in" to Find Unmet Customer Needs and Solutions, MIT Sloan School of Management, pp. 1-29 (Jul. 2002).
Gu-In Kwon et al., "ROMA: Reliable Overlay Multicast with Loosely Coupled TCP Connections," Boston University, pp. 1-12.
Jaime Teevan et al., "Potential for Personalization," Microsoft Research, ACM Transactions on Computer-Human Interaction, N:1-35 (2009).
Jay DiMare, "Changing the way industries work: The impacts of service-oriented architecture," IBM Global Business Services, pp. 1-14 (2006).
Jim Held et al., "Immersive Connected Experiences: How connected visual computing will change the virtual world as well as the actual world," Intel Corporation, pp. 1-6 (Nov. 20, 2008).
John B. Horrigan, "Pew Internet Project Data Memo," Pew Internet & American Life Project, pp. 1-14 (Nov. 16, 2008).
John Hagel III et al., "Measuring the forces of long-term change: The 2010 Shift Index," Deloitte Development LLC, pp. 1-196 (2010).
Kate Greene, "Hyperlinking Reality via Phones," Technology Review, pp. 1-2 (Nov. 20, 2006) http://www.technologyreview.com/printer_friendly_article.
Katie Minardo Scott, "Is Usability Obsolete?" MAYA Design: interactions, pp. 6-11 (May + Jun. 2009).
Manuel Torres et al., "A Language to Define External Schemas in ODMG Databases," Journal of Object Technology, 3(10):181-192 (Nov.-Dec. 2004).
Marco de Gemmis et al., "A Retrieval Model for Personalized Searching Relying on Content-based User Profiles," AAAI, pp. 1-9 (2008) www.aaai.org.
Michael Higgins et al., "Shepherdable Indexes and Persistent Search Services for Mobile Users," MAYA Design, Inc., DOA, pp. 1-19 (Oct. 30-Nov. 1, 2006).
Peter Moskovits, "2 Easy Steps to Implement Inter-Portlet Communication with WSRP 2.0," pp. 1-8 (Aug. 22, 2008).
Prith Banerjee et al., "Everything as a Service: Powering the New Information Economy," IEEE:Computer, pp. 36-43 (Mar. 2011).
PWC, "A closer look*, Patent litigation trends and the increasing impact of nonpracticing entities," PriceWaterhouseCoopers, pp. 1-24 (2009) pwc.com/us/forensics.
Rafe Needleman, "Comcast's goal: Integrate the screens," CNET News.com, pp. 1-4 (Jun. 25, 2008).
Raja Bose, "Sensor Networks—Motes, Smart Spaces, and Beyond," IEEE CS, pp. 84-90 (Jul.-Sep. 2009).
Rama Chellappa et al., "Face Recognition by Computers and Humans," IEEE Computer Society, pp. 46-56 (Feb. 2010).

(56) References Cited

OTHER PUBLICATIONS

Rebecca Jennings, "The Interactive Marketing Metrics You Need," Forrester, pp. 1-13 (May 29, 2008).
Roger E. Bohn et al., "How Much Information? 2009 Report on American Consumers," Global Information Industry Center, pp. 1-37 (Dec. 9, 2009) http://hmi.ucsd.edu/howmuchinfo.php.
Seng W. Loke et al., "Building Taskable Spaces over Ubiquitous Services," Pervasive computing, IEEE CS pp. 72-78(Oct.-Dec. 2009) www.computer.org/pervasive.
Thomas Claburn, "Apple Patent May Be Prelude to iGlasses," InformationWeek, pp. 1-3 (Apr. 17, 2008).
Vanessa Chan et al., "Assessing innovation metrics," McKinsey Global, pp. 1-11 (Oct. 2008).
Walter Dawkins, "Broadcast News," Newsweek, pp. 1-2 (2008) http://www.newsweek.com/id/175602.
Wikipedia, "Data Universal Numbering System" Wikipedia, pp. 1-2 (Apr. 3, 2008) http://en.wikipedia.org/wiki/Data_Universal_Numbering_System.
www.customercarewords.com, "What is Customer Carewords?" pp. 1-2 (2008).
www.customercarewords.com, "What is the Long Neck?" pp. 1-3 (2008).
Soat, John, www.informationweek.com, "HP CIO Randy Mott: Incremental IT 'Just Doesn't Work'" pp. 1-3 (2008).
www.savvion.com, "Business Process Lifecycle Management with Savvion BusinessManager," Savvion, Inc., pp. 1-12 (Mar. 2008).
www.savvion.com, "Business Process Modeling and Analysis with Savvion BusinessManager," Savvion, Inc., pp. 1-9 (Mar. 2008).
www.savvion.com, "Communications Order Management Solution," Savvion Inc., pp. 1-6 (2008).
www.savvion.com, "Understanding the Value of Process Rules," Savvion, Inc., pp. 1-17 (Mar. 2008).
Naone, Erica, www.technologyreview.com, Technology Review: Blogs: TR Editors' blog: Google Makes Texting Simple pp. 1-4(Dec. 12, 2008).
Skogstad, Emma, www.webpronews.com, Using Benchmarking Metrics to Uncover Best Practices, pp. 1-5 (Jul. 1, 2003).
www.websiteoptimization.com, Website Optimization Metrics—Chapter 10, pp. 1-5 (2009).
Broil, Wolfgang, "DWTP—An Internet Protocol for Shared Virtual Environments," GMD German National Research Center for Information Technology Institute for Applied Information Technology (FIT), Proceedings International Symposium on the Virtual Reality Modeling language 1998 (VRML '98), ACM, ACM SIGGRAPH, pp. 49-56 (8 pages).
Gross, Ralph, "Face Databases," in Handbook of Face Recognition, Springer-Verlag, pp. 301-327 (2005).
Gschwandtner, Gerhard, "Defining the Sales 2.0-Enabled Business," WebEx Communications White Paper, pp. 1-8 (2006).
Hagel III et al., "The Power of Pull: Improved Performance in Less Time with Greater Impact," in The Dbriefs Technology, Media & Telecommunications (TMT) series, pp. 1-30 (Mar. 24, 2010).
Haller et al., "Handling heterogeneity in RosettaNet messages," in SAC, Seoul, Korea (Mar. 11-15, 2007).
Healey et al., "Culture Change Considerations Due to Unified Communications," IDC, pp. 1-5 (Jun. 2008).
Hepp et al., "A quantitative analysis of product categorization standards: content, coverage, and maintenance of eC1@ss, UNSPSC, eOTD, and the RosettaNet Technical Dictionary," Knowledge and Information Systems, pp. 1-38 (2006).
Hess, Frederick M., "Still at Risk," American Enterprise Institute for Public Policy Research, Education Outlook, 2:1-6 (Apr. 2008).
Hewlett-Packard Development Company, L.P., "HP Next Generation Operations Support Systems (HP NGOSS)" (2008).
Hildebrand et al., "XEP-0025: Jabber HTTP Polling,"http://xmpp.org/extensions/xep-0025.html., pp. 1-8 (Jun. 29, 2010).
Hildebrand et al., "XEP-0030: Service Discovery," http://xmpp.org/extensions/xep-0030.html, pp. 1-25 (Jun. 29, 2010).
Hildebrand et al., "XEP-0115: Entity Capabilities," http://xmpp.org/extensions/xep-0115.html, pp. 1-19 (Jun. 29, 2010).
Hines, Andrew, "How Operations Research Drives Success at P&G," http://www.bet.com, pp. 1-4 (Jun. 30, 2008).
Hoffman, Donna L., "Managing beyond Web 2.0," McKinsey Quarterly, pp. 1-4 (Jul. 2009).
Horrigan, John B., "Consumption of Information Goods and Services in the United States," Pew Internet & American Life Project, pp. 1-39 (2003).
Hsee et al., "Hedonomics: Bridging Decision Research with Happiness Research," Perspectives on Psychological Science, 3(3):224-243 (2008).
http://datatracker.ietf.org/wg/simple/, datatracker.ietf.org, "SIP for Instant Messaging and Presence Leveraging Extensions (simple)," pp. 1-2 (Jun. 29, 2010).
http://en.wikipedia.org/wiki/Extensible_messaging_and_presence_protocol, "Extensible Messaging and Presence Protocol," pp. 1-7 (Jun. 29, 2010).
http://en.wikipedia.org/wiki/Session_Initiation_Protocol,"Session Initiation Protocol—Wikipedia, the free encyclopedia," pp. 1-7 (Jun. 29, 2010).
http://en.wikipedia.org/wiki/SIMPLE, "SIMPLE—Wikipedia, the free encyclopedia," pp. 1-2 (Jun. 29, 2010).
Hua et al., "Video Delivery Technologies for Large-Scale Deployment of Multimedia Applications," Proceedings of the IEEE, 92(9):1439-1451 (2004).
HubSpot, "The State of Inbound Marketing 2010" (Feb. 2010).
Huston, Geoff, "QoS Fact or Fiction," The Internet Protocol Journal, 3(1):1-7 (Oct. 3, 2008).
IBM Consulting Services, "Building Composite, Role-Based Dashboards with WebSphere Dashboard Framework," Redpaper (Aug. 2007).
IBM Consulting Services, "Confounded by consumer purchase decision?" (2004).
IBM Global Business Services, "Hiding in plain sight," IBM Institute for Business Value, pp. 1-20 (2006).
IBM Global Business Services, "Inheriting a complex world," Executive Report, pp. 1-16 (2010).
IBM Global Business Services, "Unlocking the DNA of the Adaptable Workforce," The Global Human Capital Study, pp. 1-72 (2008).
IBM Global Business Services, "Who's in charge here?" (2006).
IBM Institute for Business Value, "Meeting the demands of the smarter consumer," Executive Report, pp. 1-16 (2010).
IBM, "B2B e-commerce with WebSphere Commerce Business Edition V5.4 Patterns for e-business Series," RedBooks, pp. 1-380 (2003).
IBM, "Human—Centric Business Process Management with WebSphere Process Server V6," RedBooks, pp. 1-776 (2007).
IBM, "Integrated data analytics," IBM Institute for Business Value, pp. 1-28 (2005).
IBM, "Patterns for the Edge of Network," RedBooks, pp. 1-422 (2002).
IBM, "Patterns: Implementing an SOA Using an Enterprise Service Bus," RedBooks, pp. 1-386 (2004).
IBM, "Patterns: Serial and Parallel Processes for Process Choreography and Workflow," Redbooks, pp. 1-442 (2004).
IBM, "Patterns: SOA Foundation Service Creation Scenario," Redbooks, pp. 1-556 (2006).
IBM, "The retail divide: Leadership in a world of extremes," IBM Business Consulting Services, pp. 1-40 (2004).
InformationWeek, "Google Offers Mini-Programs for Use on Other Sites," http://www.informationweek.com/story/showArticle.jhtml?articleID=193104216, pp. 1-2 (Oct. 5, 2006).
Jamison, Wilfred, "Jump-start business activity monitoring (BAM), Part 11: Monitoring human tasks with WebSphere Business Monitor," http://www.ibm.com, pp. 1-16 (Oct. 30, 2007).
Jennings et al., "Relay Extensions for the Message Session Relay Protocol (MSRP)," *Network Working Group*, The IETF Trust, pp. 1-37 (Sep. 2007).
Jonietz, Erika, "TR10: Augmented Reality," http//www.technologyreview.com, pp. 1-2 (Mar. 12, 2007).
Jupitermedia Corp., "Using BSM to Manage Your Business Applications," pp. 1-17 (2008).
Kambil, Ajit, "Good ideas are not enough: Adding execution muscle to innovation engines," Accenture, pp. 1-20 (2002).

(56) References Cited

OTHER PUBLICATIONS

Kania et al., "Collective Impact," Stanford Social Innovation review, pp. 1-9 (Winter 2011).
Khalaf, Rania, "From RosettaNet PIPs to BPEL Processes: A Three Level Approach for Business Protocols," LNCS, 3649:364-373 (2005).
Kidwai, Naj, "The new targeting: Combining user profile and interaction data for more effective engagement," http://www.dmnews.com, pp. 1-2 (May 18, 2009).
Kleiner, Art, "The Evolution of Technology," http://www.strategy-business.com, pp. 1-4 (Jan. 4, 2010).
Koskimies, Matti, "Composing Services in SOA: Workflow Design, Usage and Patterns," Seminar on Service-Oriented Software Engineering, Helsinki, Finland (Mar. 10, 2006).
Krazit, Tom, "Apple patent application blends touch, voice, face," http://news.cnet.com/8301-13579_3-10032604-37.html?tag=n1.e433, pp. 1-3 (Sep. 5, 2008).
Kröner et al., "A Framework for Ubiquitous Content Sharing," IEEE CS, pp. 58-65 (Oct.-Dec. 2009).
Levy, Steven, "Steven Levy on the Celebrity Executive," http://wired.com/magazine/tag/lady-gaga/, pp. 1-2 (Jun. 23, 2011).
Lieberman et al., "A Goal-Oriented Interface to Consumer Electronics using Planning and Commonsense Reasoning," Intelligent User Interfaces, pp. 1-8 (2006).
Light Minds Ltd., "Understanding customer need during new product development: The application of ethnography," in: Light Minds Delivering Customer Insight, pp. 1-6 (2005).
Linder, Jane C., "Design Imperatives for Engaged Learning," Accenture, pp. 1-11 (Mar. 2000).
Lowery, Sally, "Impactful Email Marketing: Using Behavioral Analytics to Create Relevant Messages," Bronto Software, Inc., pp. 1-4 (2008).
Mack et al., "Knowledge portals and the emerging digital knowledge workplace," IBM Systems Journal, 40(4):925-955 (2001).
Mayrhofer, A., "IANA Registration for Enumservice 'XMPP'," *Network Working Group*, The IETF Trust, pp. 1-8 (Aug. 2007).
McQuaid et al., "An Integrated Method for Evaluating Interfaces," Usability Professionals' Association 2001 Conference Proceedings, pp. 1-6 (2001).
Mehta et al., "Branded Virtual Goods Market Report: Opportunities and Strategies for Aligning Brands with Virtual Goods," Viximo and Virtual Greats, pp. 1-17 (Aug. 2, 2010).
Meyers et al., "Handheld Devices for Control," Human-Computer Interaction Consortium, Winter Park, Colorado (Feb. 5-9, 2003).
Nail, Jim, "Brand Monitoring Moves into the Mainstream," Forrester® Quick Take, pp. 1-2 (Oct. 7, 2005).
Naone, Erica, "Traveling the Web Together," http://www.technologyreview.com, pp. 1-4 (Jun. 23, 2009).
Nguyen et al., "Jump-start business activity monitoring (BAM), Part 7: Implement duration metrics in WebSphere Monitor 6.0.2," http://www.ibm.com, pp. 1-11 (Jul. 31, 2007).
Niemi, A., "Session Initiation Protocol (SIP) Extension for Event State Publication," *Network Working Group*, The Internet Society, pp. 1-33 (Oct. 2004).
NUS, "Government IT Governance Framework," (2008).
NUS, "SGEA-Magenta," pp. 23-29 (2008).
Olsen, Stefanie, "33Across: The next generation of behavioral ad targeting," http://www.news.cnet.com, pp. 1-5 (Jun. 23, 2008).
Oracle, "Circumstances and Customers Have Changed: Has Your Loyalty Program Kept Pace?" Peppers & Rogers Group, pp. 1-13 (2009).
Patterson et al., "An Ecosystem for Learning and Using Sensor-Driven IM Status Messages," IEEE CS, pp. 42-49 (Oct.-Dec. 2009).
Pilot Software, Inc., "How to Jump Start Your Performance Management Project: A four-step approach," pp. 1-6 (2005).
Prahalad et al., "Twenty Hubs and No HQ" Strategy+business, 50:1-8 (2008).
Roach, AB, "Session Initiation Protocol (SIP)—Specific Event Notification," *Network Working Group*, The Internet Society, pp. 1-39 (Jun. 2002).
Rosenberg, J., "A Data Model for Presence," *Network Working Group*, The Internet Society, pp. 1-36 (Jul. 2006) .
Rosenberg, J., "A Presence Event Package for the Session Initiation Protocol (SIP)," *Network Working Group*, The Internet Society, pp. 1-28 (Aug. 2004).
Rosenberg, J., "A Watcher Information Event Template—Package for the Session Initation Protocol (SIP)," *Network Working Group*, The Internet Society, pp. 1-21 (Aug. 2004).
Rosenberg, J., "An Extensible Markup Language (XML) Based Format for Watcher Information," *Network Working Group*, The Internet Society, pp. 1-14 (Aug. 2004).
Rosenberg, J., "Presence Authorization Rules," *Network Working Group*, The IETF Trust, pp. 1-29 (Dec. 2007).
Rosenberg, J., "The Extensible Markup Language (XML) Configuration Access Protocol (XCAP)," *Network Working Group*, The IETF Trust, pp. 1-72 (May 2007).
Sabbagh et al., "Designing the Transcendent Web: The Power of Web 3.0," Booz & Company, pp. 1-16 (2011).
Saint-Andre, P., "A Uniform Resource Name (URN) Namespace for Extensions to the Extensible Messaging and Presence Protocol (XMPP)," *Network Working Group*, The IETF Trust, pp. 1-10 (Apr. 2007).
Saint-Andre, P., "End-to-End Signing and Object Encryption for the Extensible Messaging and Presence Protocol (XMPP)," *Network Working Group*, The Internet Society, pp. 1-28 (Oct. 2004).
Saint-Andre, P., "Extensible Messaging and Presence Protocol (XMPP) : Core," *Network Working Group*, The Internet Society, pp. 1-91 (Oct. 2004).
Saint-Andre, P., "Internationalized Resource Identifiers (IRIs) and Uniform Resource Identifiers (URIs) for the Extensible Messaging and Presence Protocol (XMPP)," *Network Working Group*, The IETF Trust, pp. 1-27 (Feb. 2008).
Saint-Andre, P., "Mapping the Extensible Messaging and Presence Protocol (XMPP) to Common Presence and Instant Messaging," *Network Working Group*, The Internet Society, pp. 1-35 (Oct. 2004).
Saint-Andre, Peter, "XEP-0045: Multi-User Chat," http://xmpp.org/extensions/xep-0045.html, pp. 1-122 (Jun. 29, 2010).
Saint-Andre, Peter, "XEP-0071:XHTML-IM," http://xmpp.org/extensions/xep-0071.html, pp. 1-30 (Jun. 29, 2010).
Saint-Andre, Peter, "XEP-0163: Personal Eventing Protocol," http://www.xmpp.org/extensions/xep-0163.html, pp. 1-17 (Jun. 29, 2010)
Saint-Andre, Peter, "XEP-0174: Serverless Messaging," http://xmpp.org/extensions/xep.0174.html, pp. 1-22 (Jun. 29, 2010).
Satmetrix, "Creating a Sampling Strategy for Your Business," Trustworthy Data White Paper Series, pp. 1-15 (2000).
Schulten et al., "The E-Commerce Product Classification Challenge," IEEE Intelligent Systems Magazine, special issue on Intelligent E-business, pp. 1-8 (Jul./Aug. 2001).
Schulzrinne et al., "Common Policy: A Document Format for Expressing Privacy Preferences," *Network Working Group*, The IETF Trust, pp. 1-33 (Feb. 2007).
Schulzrinne et al., "RPID: Rich Presence Extensions to the Presence Information Data Format (PIDF)," *Network Working Group*, The Internet Society, pp. 1-38 (Jul. 2006).
Schulzrinne, H., "CIPID: Contact Information for the Presence Information Data Format," *Network Working Group*, The Internet Society, pp. 1-12 (Jul. 2006).
Schulzrinne, H., "Timed Presence Extensions Indicate Status Information Data Format (PIDF) to Indicate Status Information for Past and Future Time Intervals," *Network Working Group*, The Internet Society, pp. 1-10 (Jul. 2006).
Sherman, Erik, "Apple Wants to Own Software Publishing for iPhones and iPads," http://www.bnet.com, pp. 1-2 (Dec. 9, 2010).
Sherman, Erik, "Apple's Secret App Contract: Developers Pay Apple Even When Users Don't," , http://www.bnet.com, pp. 1-2 (Mar. 10, 2010).
Smiley, John, "Service is the Path to Growth: How Communications Companies Can Gain Market Share in the Digital Home," Accenture, pp. 1-6 (2010).
Stauffer, David, "Best Practices for Benchmarking," Harvard Business School Working Knowledge, http://hbswk.hbs.edu, pp. 1-4 (Oct. 27, 2003).

(56) References Cited

OTHER PUBLICATIONS

Sugano et al., "Presence Information Data Format (PIDF)," *Network Working Group*, The Internet Society, pp. 1-29 (Aug. 2004).
Techdirt, "And What If Tangible Goods Become More Abundant?" , http://www.techdirt.com/articies/20080806/0111171907.shtml, pp. 1-8 (Sep. 5, 2008).
Temkin, Bruce D., "The Chief Customer/Experience Officer Playbook," Forrester®, pp. 1-18 (Oct. 3, 2007).
Thomas et al., "How to create a culture of high performance," Outlook (Jan. 2007).
van den Dam et al., "The changing face of communication," IBM Institute for Business Value, pp. 1-24 (2008).
Booz et al., "A Blueprint for Strategic Leadership," Resilience Report, pp. 1-14 (Jan. 10, 2008).
Hamid et al., "Challenges for Joint Battlespace Digitization (JBD)," In ROT IST Symposium on "New Information Processing Techniques for Military Systems," Istanbul, Turkey (Oct. 2000).
Wiederhold, Gio, "Follow the Intellectual Property," Communications of the ACM, 54(1):66-74 (2011).
Williams, Mark, "The State of the Global Telecosm," Technology Review, http://www.technologyreview.com/review/409957/the-state-of-the-global-telecosm/, pp. 1-4 (May/Jun. 2008).
Wood, Lamont, "Feds: Accuracy of Face Recognition Software Skyrockets," http://www.livescience.com, pp. 1-2 (Apr. 13, 2007).
Yee et al., "Native Client: A Sandbox for Portable, Untrusted x86 Native Code," in 30$^{th}$ IEEE Symposium on Security and Privacy (May 17-20, 2009).
Zimmerman et al., "It's a networked world, after all," Outlook, 1:1-10 (2009).
Zimmerman, Andrew B., "Living in a device-centric world," Outlook Point of View (Feb. 2008).
Zimmerman, Andrew, "You say "convergence"; we say "trivergence"," Outlook, 3:6-7 (2005).
John Tehranian, "Parchment, Pixels, & Personhood: User Rights and the IP (Identity Politics) of IP (Intellectual Property)," University of Colorado Law Review, 82:1-84 (2011) http://ssrn.com/abstract.
Jongmin Lee et al., "QoS Mapping over Hybrid Optical and Wireless Access Networks," IEEE Computer Society, pp. 139-141 (2009).
Juan Carlos Castilla-Rubio et al., "Planetary Skin: A Global Platform for a New Era of Collaboration," Cisco Internet Business Solutions Group (IBSG), pp. 1-7 (Mar. 2009) www.cisco.com/go/ibsg.
Juho Tikkala, "Implementing a Rosettanet Business-to-Business Integration Platform Using J2EE and Web Services," Helsinki University of Technology, pp. 1-111 (Aug. 11, 2004).
Julie Napoli et al., "Brand Matters: An Examination of Small-to-Medium Sized Enterprises," ANZMAC 2005 Conference: Branding, pp. 65-69 (2005).
Kathryn Britton, "Tight Console Content Integration with Loose Development Integration," IBM Software Group, pp. 1-9 (Apr. 22, 2004).
Katie Minardo Scott, "The Feed: Is usability obsolete? (Part II)," MAYA Design, Inc., pp. 1-4 (Mar. 9, 2009).
Keith Kistler, "Beginning the Autonomic Journey—A review & lessons learned from an Autonomic Computing Readiness Assessment @ A Major US Telecomm," IBM Global Services, pp. 1-16 (Apr. 21, 2004).
Kevin J. Boudreau et al., "Platform Rules: Multi-Sided Platforms as Regulators," Harvard Business School, pp. 1-29 (2008) http://ssrn.com/abstract.
Knowledge@Wharton, "Will Technology Firms Bridge the Chasm Between Computer and TV?" Wharton School, pp. 1-3 (Jun. 25, 2008).
Knowledge@Wharton, "Will the Future of Advertising Be a Blend of Old and New Media?" Knowledge Wharton, pp. 1-3 (Sep. 30, 2009) (http://knowledge.wharton.upenn.edu/article.cfm?articleid=2344).
Kuldar Taveter, "Business Process Automation With Representing and Reasoning on Trust," University of Melbourne, Victoria, Australia, www.cs.mu.oz.au/~kuldar/ pp. 1-7.
L. Gorlenko et al., "No wires attached: Usability challenges in the connected mobile world," IBM SYSTEMS JOURNAL 42:639-651 (2003).
Larry Hardesty, "How wise are crowds?" MIT News Office, pp. 1-3 (Nov. 16, 2010).
Larry Peterson et al., "Overcoming the Internet Impasse through Virtualization," GENI (Global Environment for Network Innovations, pp. 1-7 (Apr. 2005).
Laura W. Geller, "Business Success from the Bottom Up," strategy+business, pp. 1-4 (Apr. 8, 2008).
Lawrence D. Bergman et al., "Capturing procedures for autonomic systems by demonstration," IBM Research, pp. 1-5 (Apr. 2004).
Li Lao et al., "A Comparative Study of Multicast Protocols: Top, Bottom, or in the Middle?" UCLA, pp. 1-14 (Jan. 2005).
Li Lao et al., "A Scalable Overlay Multicast Architecture for Large-Scale Applications," UCLA, pp. 1-20 (Jul. 2004).
Li Lao et al., "Multicast Service Overlay Design," National Science Foundation, pp. 1-8 (2005).
Li Lao et al., "TOMA: A Viable Solution for Large-Scale Multicast Service Support*" In Proceedings of IFIP Networking, pp. 1-12 (2005).
Liferay, "Liferay Portal," LIFERAY Enterprise, pp. 1-2 (2008) http://www.liferay.com/web/guest/products/portal.
M. Angela Sasse, "Privacy and Security Not Seeing the Crime for the Cameras?" Communications of the ACM, 53:22-25 (Feb. 2010).
Mahesh H. Dodani, "From Objects to Services: A Journey in Search of Component Reuse Nirvana," Journal of Object Technology, 3(8):49-54 (Sep.-Oct. 2004).
Marco Brambilla et al., "A Software Engineering Approach to Design and Development of Semantic Web Service Applications," International Semantic Web Conference (ISWC2006), pp. 172-186 (Nov. 2006).
Mark Cornwell, et al., "Policies for Autonomy in Open Distributed Systems," Global InfoTek, Inc., pp. 1-29.
Markus Stolze et al., "Beyond Scatter-plot Visualization for Network Instrusion Monitoring: The Zurich Event Console," IBM, pp. 1-4 (Apr. 2004).
Markus Voelter, "A Taxonomy of Components," Journal of Object Technology, 2(4):119-125 (Jul.-Aug. 2003).
Matt Healey et al., "Culture Change Considerations Due to Unified Communications," IDC #212892, 1:1-5 (Jun. 2008).

* cited by examiner

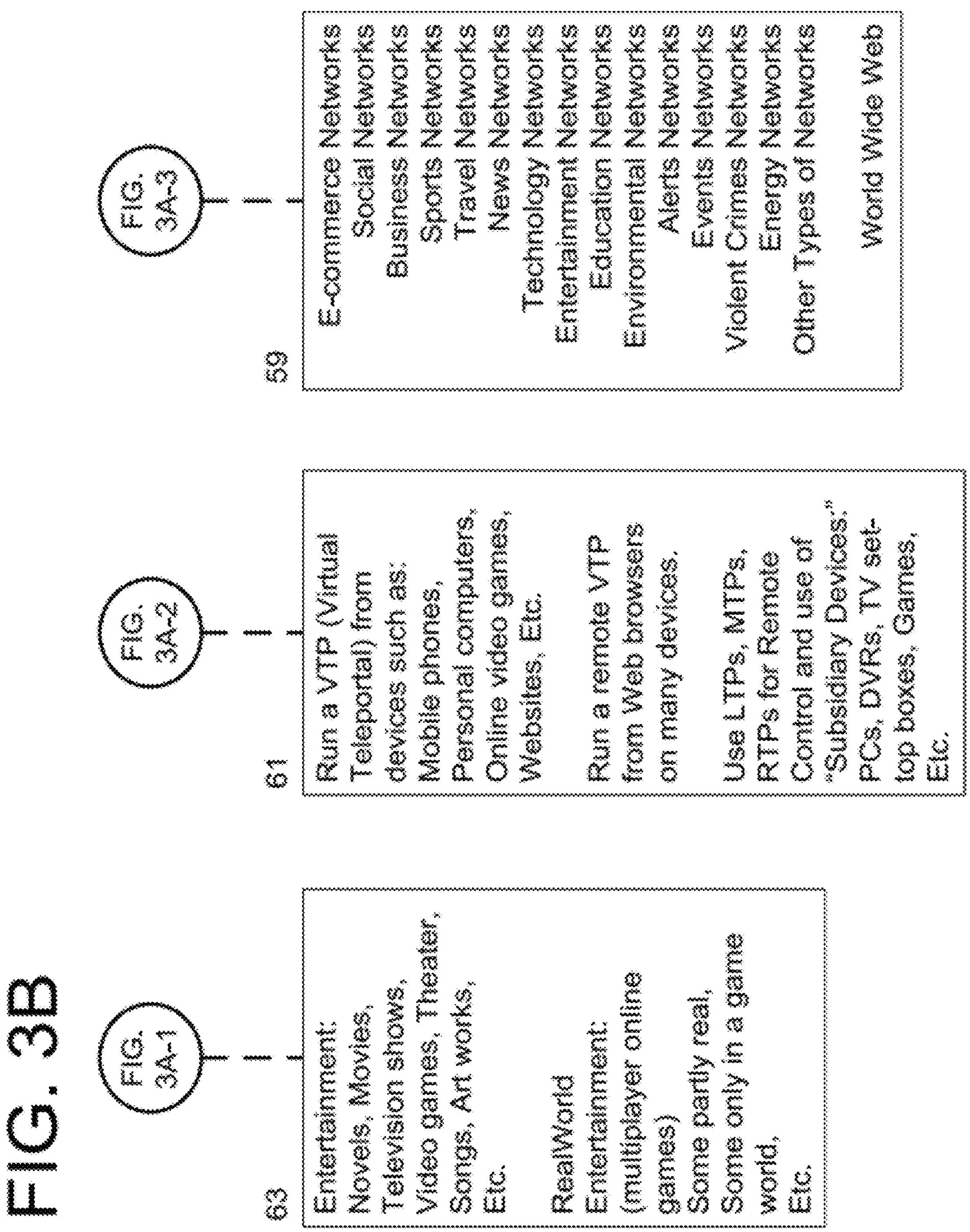
FIG. 3B
FIG. 3A-1
63
Entertainment:
Novels, Movies,
Television shows,
Video games, Theater,
Songs, Art works,
Etc.
RealWorld
Entertainment:
(multiplayer online
games)
Some partly real,
Some only in a game
world,
Etc.
FIG. 3A-2
61
Run a VTP (Virtual
Teleportal) from
devices such as:
Mobile phones,
Personal computers,
Online video games,
Websites, Etc.
Run a remote VTP
from Web browsers
on many devices,
Use LTPs, MTPs,
RTPs for Remote
Control and use of
"Subsidiary Devices:"
PCs, DVRs, TV set-
top boxes, Games,
Etc.
FIG. 3A-3
59
E-commerce Networks
Social Networks
Business Networks
Sports Networks
Travel Networks
News Networks
Technology Networks
Entertainment Networks
Education Networks
Environmental Networks
Alerts Networks
Events Networks
Violent Crimes Networks
Energy Networks
Other Types of Networks
World Wide Web

| 2011 **Environment** | 2012 **Location** | 2013 **Sensors** | 2014 **Power** | 2015 **Control** | 2016 **Communications** |
|---|---|---|---|---|---|
| WATER | Florida Coral Reef | Camera, Mic, | Solar, Battery | RC, Apps | WiMax, Satellite |
|  | Bora-Bora Hotel Reef | Camera, Mic, GPS, Weather, IR, etc. | Solar, Battery, A | RC, Apps | WiFi, WiMax, Satellite, etc. |
| AIR 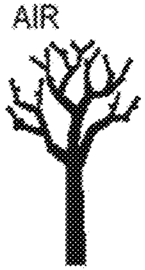 | Penthouse Balcony over Central Park, NY | Camera, Mic, GPS, Weather, IR, etc. | A/C | RC, Apps | WiFi, Wired, etc. |
| | Tree on Amazon River | Cameras, Mics, GPS, Weather, IR, etc. | Solar, Battery | RC, Apps | WiMax, Satellite, etc. |
|  | Tower or balloon over landmark or attraction | Cameras, Mics, GPS, Weather, IR, etc. | A/C, Solar, Battery | RC, Apps | WiMax, Satellite, etc. |
| SPACE | Weather Satellite | Camera, IR, etc. | Solar, Battery | RC, Apps | Radio, Satellite |

FIG. 28B

| 2031 Environment | 2032 Mobility Example | 2033 Sensors | 2034 Power | 2035 Control | 2036 Communications |
|---|---|---|---|---|---|
| OCEAN  | Ship or Boat | Camera, Mics, Motion, GPS, IR, Weather, etc. | Solar, Battery | RC, Apps | WiFi, WiMax, Wired, Satellite, etc. |
| 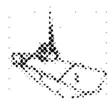 | RC Submarine or Underwater Glider | Camera, Mics, GPS, Weather, IR, etc. | Solar, Battery | RC, Apps | WiFi, WiMax, Satellite |
| SKY 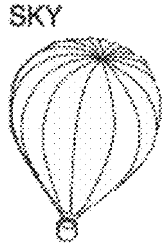 | Balloon (Weather, Helium, Hot Air, etc.) | Camera, Mic, GPS, Weather, IR, etc. | A/C, Battery, Solar | RC, Apps, | WiFi, WiMax, Satellite, etc. |
| | RC Aircraft, UAV, Drone, etc. | Camera, Mic, GPS, Weather, IR, etc. | Solar, Battery | RC, Apps | WiMax, Satellite, etc. |
| 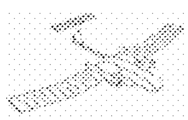 | RC Helicopter | Camera, Mic, GPS, Weather, IR, etc. | Solar, Battery | RC, Apps | WiMax, Satellite, etc. |
| SPACE 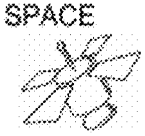 | Satellite | Camera, etc. | Solar, Battery | RC, Apps | Radio, Satellite |
| | RC Probe | Camera, etc. | Solar, Battery | RC, Apps | Radio, Satellite |

Figure 55C

2201 Individual's Subsidiary Devices Layer

2202

(example) An Individual's Subsidiary Devices / A Server's SD's

| 2203 Identity/ SPLS | 2204 Device Name/ Icon | 2205 Device Vendor / Model | 2206 Device Protocols | 2207 Device Address | 2208 Device Interface | 2209 Device Control Apps | 2210 Login Required |
|---|---|---|---|---|---|---|---|
| Identity1, SPLS1 | Fname's Laptop | Device ID | A, B | Address | LAN, WiFI | Control app(s) | Password |
| Identity2, SPLS5 | Set top box/DVR | Device ID | C, D | Address | IR, LAN | Control app(s) ID | Null (N.A.) |
| ... | ... | ... | ... | ... | ... | ... | ... |

* IPTR: Identity, Place, Tool, Resource, Etc.

FIG. 166

| 9420<br>Name | 9421<br>Type | 9422<br>Name | 9423<br>User ID | 9424<br>Password |
|---|---|---|---|---|
| John Smith | Work | Windows Network | JBSmith | bl2sveen |
| " | Work | Mainframe | JBSmith2 | Hh7b56TzywnN |
| " | Financial | Online bank account | John_Smith | JS65432jsjs |
| " | Personal | Personal email address | cruiser99@aol.com | JS9898jsjs |
| " | Personal | U of Michigan Alumni | dunkshot42 | JS9898jsjs |
| " | Professional | Professional society 1 | JSmith1357 | JS9898jsjs |
| " | Online travel | Travelocity, Orbitz, etc. | galaxy57 | JS9898jsjs |
| " | Personal | Blog | John_Smith321 | JS9898jsjs |
| " | Commerce | Amazon.com | Smith_JB1357 | JS65432jsjs |
| " | Commerce | PC Tech Support | customer579 | JS65432jsjs |
| " | Personal | Facebook | JohnSmith | JS65432jsjs |

FIG. 168

| 9450<br>User | 9451<br>Self-created Groups | 9452<br>Identity Type | 9453<br>Identity Name | 9454<br>Contact data for each Identity |
|---|---|---|---|---|
| John S. | Family | John Family | John | First Name, Last Name |
| | Career | Work | John Smith (real) | Address 1, Address 2 |
| | " | My Business | Nelson Kennedy | City, ST, Postal Code, Country |
| | " | Researcher | Hugh McCann | Home Phone, Work Phone, Cell Phone |
| | Fun | Traveler | Kurt Bennett | Email Address(es) |
| | " | Partying | Erik Scott | Government #1, #2, etc. (such as SSNs) |
| | " | Virtual | Angelica | Biometric ID1, Biometric ID2, etc. |
| | | | | Goal 1, Goal 2, Etc. |
| | | | | Etc. |
| Sam J. | Lives | Personal/Work | Sam Jones (real) | Same contact data set for each identity |
| | " | Personal 1 | Lance Yesman | |
| | " | Secret 1 | Alan Allright | |
| Jill B. | Earnings | Job | Jill Brown (real) | Same contact data set for each identity |
| | " | Business 1 | Mary Mathews | |
| | " | Business 2 | Ted Hamil | |
| | Getaways | Second home | Jenny Thomas | |
| ... | ... | ... | ... | ... |

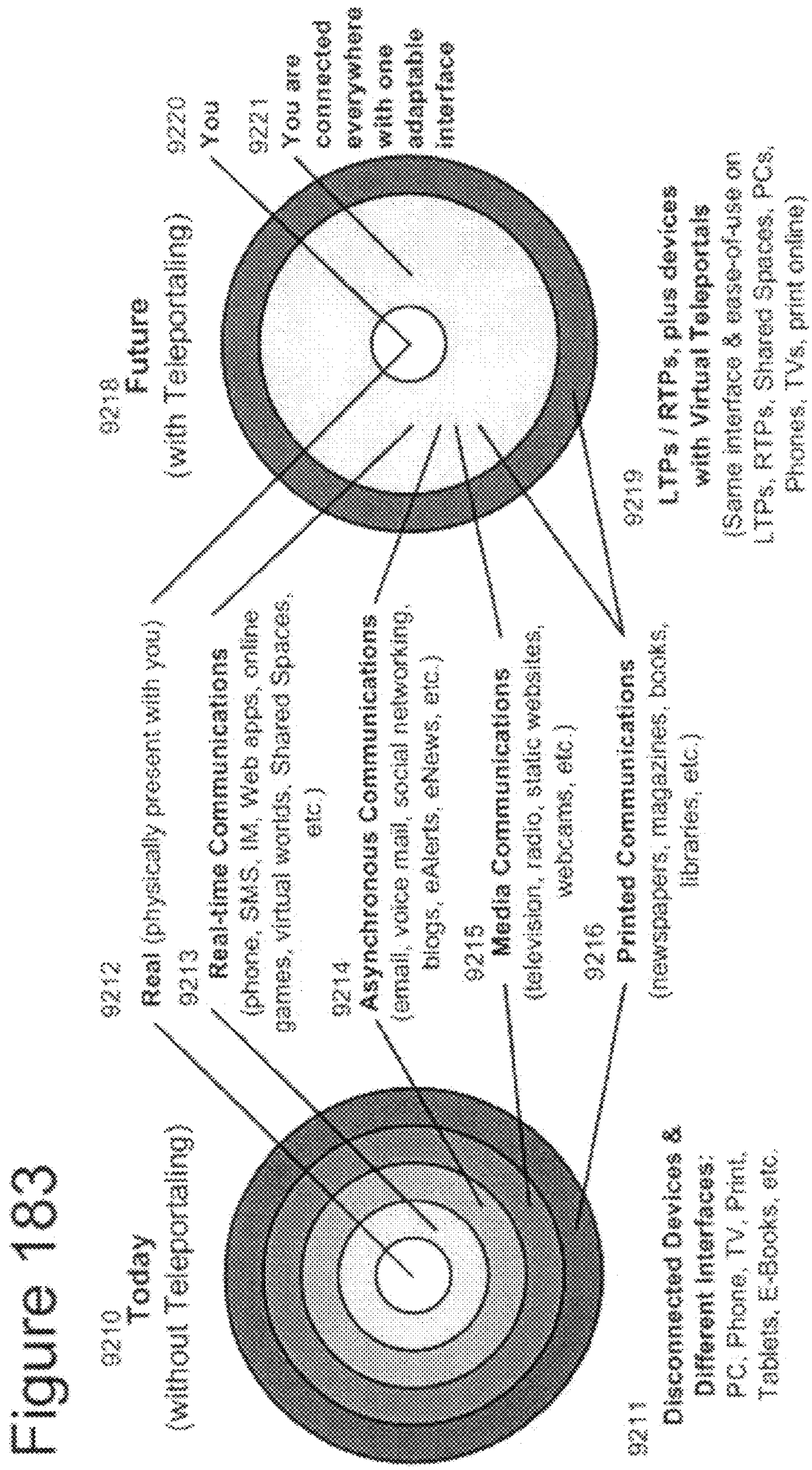
Figure 183
9210
Today
(without Teleportaling)
9211
Disconnected Devices & Different Interfaces: PC, Phone, TV, Print, Tablets, E-Books, etc.
9212
Real (physically present with you)
9213
Real-time Communications (phone, SMS, IM, Web apps, online games, virtual worlds, Shared Spaces, etc.)
9214
Asynchronous Communications (email, voice mail, social networking, blogs, eAlerts, eNews, etc.)
9215
Media Communications (television, radio, static websites, webcams, etc.)
9216
Printed Communications (newspapers, magazines, books, libraries, etc.)
9218
Future
(with Teleportaling)
9219
LTPs / RTPs, plus devices with Virtual Teleportals
(Same interface & ease-of-use on LTPs, RTPs, Shared Spaces, PCs, Phones, TVs, print online)
9220
You
9221
You are connected everywhere with one adaptable interface Time (150 to 200 years) > 8286

REALITY ALTERNATE

CROSS REFERENCE TO RELATED APPLICATIONS

This application is related to and claims the benefit of priority of U.S. Patent Application No. 61/396,644 filed May 28, 2010, entitled "REALITY ALTERNATE," and U.S. Patent Application No. 61/403,896 filed Sep. 22, 2010, entitled "REALITY ALTERNATE," the entire contents of both of which are incorporated herein by reference.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the Patent and Trademark Office publicly available files or records, but otherwise reserves all copyright rights whatsoever.

INTRODUCTION

Overview

Just as fiction authors have described alternate worlds in novels, this introduces an Alternate Reality—but provides it as technical innovation. This new Alternate Reality's "world" is named the "Expandaverse" which is a conceptual alteration of the "Universe" name and a conceptual alteration of our current reality. Where our physical "Universe" is considered given and physically fixed, the Expandaverse provides a plurality of human created digital realities that includes a plurality of human created means that may be used simultaneously by individuals, groups, institutions and societies to expand the number and types of digital realities—and may be used to provide continuous expansions of a plurality of Alternate Realities. To create the Expandaverse current known technologies are reorganized and combined with new innovations to repurpose what they accomplish and deliver, collectively turning the Earth and near-space into the equivalent of one large, connected room (herein one or a plurality of "Shared Planetary Life Spaces" or SPLS) with a plurality of new possible human realities and living patterns that may be combined differently, directed differently and controlled differently than our current physical reality.

In some examples of this Alternate Reality, people are more connected remotely, and are less connected to where they are physically present—and means are provided for multiple new types of devices, connections and "digital presence". In some examples of this Alternate Reality, information on how to succeed is automatically collected during a plurality of activities, optimized and delivered to a plurality of others while they are doing the same types of activities, leading to opportunities for higher rates of personal success and greater economic productivity by adopting the most effective new uses, technologies, devices and systems—and means are provided for this. In some examples of this Alternate Reality individuals may establish multiple identities and profiles, associate groups of identities together, and utilize any of them for earning additional income, owning additional wealth or enjoying life in new ways—and means are provided for this. In some examples of this Alternate Reality, means are enumerated for the evolution of multiple types of independent "governances" (which are separate from nation state governments) that may be trans-border and increasingly augment "governments" in that each "governance" provides means for various new types of collective human successes and living patterns that range from personal sovereignty (within a governance), to economic sovereignties (within a governance), to new types of central authorities (within a governance). In some examples of this Alternate Reality, means (herein including means such as an "Alternate Reality Machine") are provided for each identity (as described elsewhere) to create and manage a plurality of separate human realities that each provides manageable boundaries that determine the "presence" of that identity, wherein each separate reality may have boundaries such as prioritized interests (to include what is wanted), exclusion filters (to exclude what is not wanted), paywalls (to receive income such as for providing awareness and attention), digital and/or physical protections (to provide security from what is excluded), etc. In some examples of this Alternate Reality, means are provided for one or a plurality of a new type of Utility(ies) that provides a flexible infrastructure such as for this Alternate Reality's remote presence in Shared Planetary Life Spaces, automated delivery of "how to succeed" interactions, multiple personal identities, creation and control of new types of "realities broadcasting," independent "governances", and numerous fundamental differences from our current reality. In some examples means are provided for new types of fixed and mobile devices such as "Teleportals" that provide always on "digital presence" in Shared Life Spaces (which includes the Earth and near space), as well as remote control that treats some current networked electronic devices as "subsidiary devices" and provides means for their shared use, perhaps even evolving some toward becoming accessible and useful commodities. In some examples means are provided to control various networked electronic devices and turn them into commodity "subsidiary devices," enabling more users at lower cost, including more uses of their applications and digital content. In some examples of this Alternate Reality reporting on the success of various choices settings is visible and widely accessible, and the various components and systems of the Expandaverse may have settings saved, reported on, accessed and distributed for copying; it therefore becomes possible for human economic and cultural evolution to gain a new scope and speed for learning, distributing and adopting what is most effective for simultaneously achieving multiple ranges of both individually and collectively chosen goals. In a brief summation of the Expandaverse it is an Alternate Reality and these are just some of the characteristics of its divergent "digital realities," and its scope or scale are not limited by this or by any description of it.

Unlike fiction, however, this is the engineering of an Alternate Reality in which the know-how for achieving human success and human goals is widely delivered and either provided free or sold commercially. It is as if a successful Alternate Reality can now exist in a world parallel to ours—the Expandaverse as a parallel digital "universe"—and this describes the devices, technology(ies), infrastructure and "platform(s)" that comprise it, which is herein named the Alternate Reality Teleportal Machine (ARTPM). With an ARTPM modern technological civilization gains an engineered dynamic machine (that includes devices, utilities, systems, applications, identities, governances, presences, alternate realities, shared life spaces, machines, etc.) that provides means that range from bottom-up support of individuals; to top-down support of collective groups and their goals; with the results from a plurality of activities tracked, measured and reported visibly. In this Alternate Reality, a plurality of ways that people and groups choose to act are known and visible; along with dynamic guidance and reporting so that a plurality of individuals and groups may see what works and rapidly choose higher levels of personal and economic success, with faster rates of growth toward economic prosperity as well as means for disseminating it. In sum, this Alternate Reality differs from current atomized individual technologies in separate fields by presenting a metamorphosized divergent reality that re-interprets and re-integrates current and new technologies to provide means to build a different type of connected, success-focused, and evolving "world"—an Expandaverse with a range of differences and variations from our own reality.

Just as fiction authors present, the Expandaverse also proposes an alternate history and timeline from our own, which is the same history as ours until a "digital discontinuity" causes a divergence from our history. Like our reality the Expandaverse had an ancient civilizations and the Middle Ages. It also shared the Age of Physical Discovery in which Columbus discovered the "new world" and started the "age of new physical property rights" in which new lands were explored and claimed by the English, Spaniards, Dutch, French and others. Each sent settlers out into their new territories. The first settlers received "land grants" for their own farms and "homesteads". By moving into these new territories the new settlers were granted new property and rights over their new physical properties. As the Earth became claimed as property everywhere, the physical Earth eventually had all of its physical property owned and controlled. Eventually there was no more "free land" available for granting or taking. Now, when you "move" someplace new its physical properties are already owned and you must buy your physical property from someone else.

In this alternate history, the advent of an Expandaverse provides new "digital realities" that can be created, designed for specific purposes, with parts or all of them owned as new "intellectual property(ies)," then modified and improved with the means to create more digital realities—so a plurality of new forms of digital properties may be created continuously, with some more valuable than others, and with new improvements that may be adopted rapidly from others continuously making some types of digital realities (and their digital properties) more valuable than others. Therefore, due to an ARTPM, new digital properties can be continuously created and owned, and multiple different types of digital realities can be created and owned by each person. In the Expandaverse, digital property (such as intellectual properties) may become acceptable new forms of recognized properties, with systems of digital property rights that may be improved and worked out in that alternate timeline. Because the Expandaverse's new "digital realities" are continuous realities, that intellectual property does not expire (like current intellectual property expires in our Universe) so in the Expandaverse digital property rights are salable and inheritable assets, just as physical property is in the current reality. One of the new components of an Expandaverse is both that new "digital realities" can be created by individuals, corporations, nonprofits, governments, etc.; and these realities and their components can be owned, sold, inherited, etc. with the same differences in values and selling prices as physical properties—but with some key differences: Unlike the physical Earth which ran out of new property after the entire planet was claimed and "homesteaded," the ARTPM's Expandaverse provides continuous economic and lifestyle opportunities to create new "digital properties" that can be created, enjoyed, broadcast, shared, improved and sold. The ability to imagine and to copy others' successes becomes new sources of rapidly expanding personal and group wealth when the ability to turn imagination into assets becomes easier, the ability to spread new digital realities becomes an automated part of the infrastructure, and the ability to monetize new digital properties becomes standardized.

In addition, in some examples one or a plurality of these are entertainment properties which include in some examples traditional entertainment properties that include concepts such as new ARTPM devices or ARTPM technologies (such as novels, movies, video games, television shows, songs, art works, theater, etc.); in some examples traditional entertainment properties to which are added ARTPM components such as a constructed digital reality that fits the world of a specific novel, the world of a specific movie, the world of a specific video game, etc.; and in some examples a new type of entertainment such as RealWorld Entertainment (herein RWE) which blends a fictional reality (such as in some examples the alternate history of the Expandaverse) with the real world. into a new type of entertainment that fits in some examples fictional situations, in some examples real situations, in some examples fictional characters' needs, and in some examples real people's needs.

CONCEPT: The literary genre of science fiction was created when authors such as Jules Verne and H. G. Wells reconceptualized the novel as a means for introducing entire worlds containing imagined devices, characters and living patterns that did not exist when they conceived them. Many "novel" concepts conceived by "novelists" have since been turned into numerous patented inventions stemming from their stories in numerous fields like submarines, video communications, geosynchronous satellites, virtual reality, the internet, etc. This takes a parallel but different step with technology itself. Rather than starting by writing a fictional novel, this reconceptualizes current and new technology into an Alternate Reality that includes new combinations, new machines, new devices, new utilities, new communications connections, new "presences", new information "flows," new identities, new boundaries, new governances, new realities, etc. that provide an innovative reality-wide machine with technologies that focus on human success and economic abundance. In its largest sense it utilizes digital technologies to reconceptualize reality as under both collective and individual control, and provides multiple means that in combination may achieve that.

PARALLELS: An analogy is electricity that flows from standardized wall sockets in nearly every room and public place, so it is now "standard" to plug in a wide range of "standardized" electrical devices, turn them on and use them (as one part of this example, the electric plug that transfers power from a standardized electric power grid is itself numerous inventions with many patents; the simple electric plug did not begin with universal utility and connectivity). Herein, it is a startling idea that human success, remote digital presence (Shared Planetary Life Spaces or SPLS), multiple identities, individually controlled boundaries that define multiple personal realities, new types of governances, and/or myriad opportunities to achieve wider economic prosperity might be "universally delivered" during everyday activities over the "utility(ies)" equivalent to an electric power grid, by standardized means that are equivalents to multiple types of electric plugs. In this Alternate Reality, personal and group success are not just sometimes possible for a few who acquire an education, earn a lot of money and piece together disparate complex products and services. Instead, this Alternate Reality may provide new means to turn the world and near-space into one shared, successful digital room. In that Alternate Reality "room" the prosperity and quality of life of individuals, groups, companies, organizations, societies and economies—right through civilization itself—might be reborn for those at the bottom, expanded for those part-way up the ladder, and opened to new heights for those at the top—while being multiplied for everyone by being delivered in simultaneous multiple versions that are individually modifiable by commonly accessible networks and utility(ies). Given today's large and growing problems such as the intractability of poverty, economic stagnation of the middle-class, short lifetimes that cannot be meaningfully extended, incomes that do not support adequate retirement by the majority, some governments that contain human aspirations rather than achieve them, and other limitations of our current reality, a world that gains the means to become one large, shared and successful room, would unquestionably be an Alternate Reality to ours.

SAME TECHNOLOGIES PLUS INNOVATIONS: This Alternate Reality shares much with our current reality, including most of our history, along with our underlying principles of physics, chemistry, biology and other sciences—and it also shares our current technologies, devices, networks, methods and systems that have been invented from those sciences. Those are employed herein and their teachings are not repeated. However, this Alternate Reality is based on a reconceptualization of those scientific and technological achievements plus more, so that their net result is a divergent reality whose processes focus more on means to expand humanity's success and satisfaction; with new abilities to transform a plurality of issues, problems and crises on both individual and group levels; along with new opportunities to achieve economic prosperity and abundance.

A DIFFERENCE FROM ONE PHYSICAL REALITY—MULTIPLE DIGITAL REALITIES: The components of this Alternate Reality are numerous and substantially different from our reality. One of the major differences is with the way "reality" is viewed today. The current reality is physical and local and it is well-known to everyone—when you walk down a public city street you are present on the street and can see all the people, sidewalks, buildings, stores, cars, streetlights, security cameras—literally everything that is present on the street with you. Similarly, all the people present on that street at that time can see you, and when you are physically close enough to someone else you can also hear each other. Today's digital technologies are implicitly different. Using a telephone, video conference, video call, etc. involves identifying a particular person or group and then contacting that person or group by means such as dialing a phone number, entering a web address, connecting two video conferencing systems at a particular meeting time, making a computer video phone call, etc. Though not explicitly expressed, digital contact implies a conscious and mechanical act of connecting two specific people (or connecting two specific groups in a video conference). Unlike being simultaneously present like in physical reality, making digital contact means reaching out and employing a particular device and communication means to make a contact and have that accepted. Until you attempt this contact and another party accepts it, you do not see and hear others digitally, and those people do not see you or hear you digitally. This is fundamentally different from the ARTPM, one of whose means is expressed herein as Shared Planetary Life Spaces (or SPLS's).

DEVICES—Current devices (which include hardware, software, networks, services, data, entertainment, etc.): The current reality's means for these various types of digital contact, communications and entertainment superficially appear diverse and numerous. A partial list includes mobile phones, wearable digital devices, PCs, laptops, netbooks, tablets, pads, online games, television set-top boxes, "smart" networked televisions, digital video recorders, digital cameras, surveillance cameras, sensors (of many types), web browsers, the web, Web applications, websites, interactive Web content, etc. These numerous different digital devices have separate operating systems, interfaces and networks; different means of use for communications and other tasks; different content types that sometimes overlap with each other (with different interfaces and means for accessing the same types of content); etc. There are so many types and so many products and services in each type that it may appear to be an entire world of differences. When factored down, however, their similarities overwhelm their differences. Many of these different devices provide the same features with different interfaces, media, protocols, networks, operating systems, applications, etc.: They find, open, display, scroll, highlight, link, navigate, use, edit, save, record, play, stop, fast forward, fast reverse, look up, contact, connect, communicate, attach, transmit, disconnect, copy, combine, distribute, redistribute, broadcast, charge, bill, make payments, accept payments, etc. In a current reality that superficially appears to have too many different types of devices and interfaces to ever be made simple and productive, the functional similarities are revealing. This is fundamentally different from the ARTPM which simplifies devices into Teleportals plus networked electronic devices (including some applications and some digital content) that may be remotely controlled and used as "subsidiary devices," to reduce some types of complexity while increasing productivity at lower costs, by means of a shared and common interface. Again, the Expandaverse's digital reality may turn some electronic devices and some of their uses into the digital equivalent of one simpler connected room.

REVERSALS, DIVERGENCES, TRANSFORMATIONS: At a high level this Alternate Reality includes numerous major reversals, divergences and transformations from the current physical reality and its devices, which are described herein: A partial list of current assumptions that are simultaneously reversed or transformed includes:

Realities: FROM one reality TO multiple realities (with multiple identities).

Control over Reality: FROM one reality controls people TO we each choose and control our own multiple identities and each identity's one or multiple digital realities.

Boundaries: FROM invisible and unconscious TO explicit, visible and managed.

Death: FROM one too short life without real life extension, TO horizontal life expansion through multiple identities.

Presence: FROM where you are in a physical location TO everywhere in one or a plurality of digital presences (as one individual or as multiple identities).

Connectedness: FROM separation between people TO always on connections.

Contacts: FROM trying to phone, conference or contact a remote recipient TO always present in a digital Shared Space (s) from your current Device(s) in Use.

Success: FROM you figure it out TO success is delivered by one or a plurality of networks and/or utilities.

Privacy: FROM private TO tracked, aggregated and visible (especially "best choices" so leaping ahead is obvious and normal)—with some types of privacy strengthened because multiple identities also enable private identities and even secret identities.

Ownership of Your Attention: FROM you give it away free TO you can earn money from it (via Paywalls) if you want.

Ownership of Devices and Content: FROM each person buys these TO simplified access and sharing of commodity resources.

Trust: FROM needing protection TO most people are good when instantly identified and classified, with automated protection from others.

Networks: FROM transmission and communications TO identifying, tracking and surfacing behavior and identity(ies).

Network Communications: FROM electronic (web, e-store, email, mobile phone calls, e-shopping/e-catalogs, tweets, social media postings, etc.) TO personal and face-to-face, even if non-local.

Knowledge: FROM static knowledge that must be found and figured out TO active knowledge that finds you and fits your needs to know.

Rapidly Advancing Devices: FROM you're on your own TO two-way assistance.

Buying: FROM selling by push (marketing and sales) and pull (demand) TO interactive during use, based on your current actions, needs and goals.

Culture: FROM one common culture with top-down messages TO we each choose our multiple cultures and set our boundaries (paywalls, priorities [what's in], filters [what's out], protection, etc.) for each of our self-directed realities.

Governances: FROM one set of broad and "we control you" governments TO governments plus choosing your goals and then choosing one or multiple governances that help achieve the goals you want.

Acceptance of limits: FROM we are only what we are TO we each choose large goals and receive two-way support, with multiple new ways to try and have it all (both individually and collectively).

Thus, the current reality starts with physical reality predominant and one-by-one short digital contacts secondary, with numerous different types of devices for many of the same types of functions and content. The "Alternate Reality Teleportal Machine" (ARTPM) enables multiple realities, multiple digital identities, personal choice over boundaries (for multiple types of personal boundaries), with new devices, platforms and infrastructures—and much more.

The ARTPM ultimately begs for fundamental questions: Can we be happier? Significantly better? Much more successful? Able to turn obstacles into achievements? If we can choose our own realities, if we can create realities, if we can redesign realities, if we can surface what succeeds best and distribute and deliver that rapidly worldwide via the everyday infrastructure—in some examples to those who need it, at the time and place they need to succeed—then who or what will we choose to be? What will we want to become next? How long will it be before we choose our dreams and attempt to reach them both individually and collectively?

The ARTPM helps make reality into a do-it-yourself opportunity. It does this by reversing a plurality of current assumptions and shows that in some examples these reversals are substantial. In some examples people are more present remotely than face-to-face, and focus on those remote individuals, groups, places, tools, resources, etc. that are most interesting to them, rather than have a primary focus on the people where they are physically present. In some examples the main purposes of networks and communications are to track and surface behavior and activities, so that networks and various types of remote applications constantly know a great deal about who does what, where, when and how—right down to the level of each individual (though people may have private and secret identities that maintain confidentiality); this is a main part of transforming networks into a new type of utility that does more than provide communications and access to online content and services, and new online components serve individuals (in some examples helping them succeed) by knowing what they are doing, and helping them overcome difficulties. In some examples being tracked, recorded and broadcasted is a normal part of everyday life, and this offers new social and business opportunities; including both personal broadcast opportunities and new types of privacy options. In some examples active knowledge, information and entertainment is delivered where and when needed by individuals (in some examples by an Active Knowledge Machine [AKM], Active Knowledge Interactions [AKI], and contextually appropriate Active Knowledge [AK]), to raise individual success and satisfaction in a plurality of tasks with a plurality of devices (in some examples various everyday products and services) Combined, AKI/AK are designed to raise productivity, outcomes and satisfaction, which raises personal success (both economic and in other ways), and produce a positive impact on broader economic growth such as through an ability to identify and spread the most productive tools and technologies. In addition, Active Knowledge offers new business models and opportunities—in some examples the ability to sell complete lifestyles with packages of products and services that may deliver measurable and even assured levels of personal success and/or satisfaction, or in some examples the ability to provide new types of "governances" whose goals include collective successes, etc. In some examples privacy is not as available for individuals, corporations and institutions; more of what each person does is tracked, recorded and/or reported publicly; but because of these tracked data and interactions, dynamic continuous improvement may be built into a plurality of online capabilities that employ Active Knowledge of both behaviors and results. The devices, systems and abilities to improve continuously, and deliver those capabilities online as new services and/or products, are owned and controlled by a plurality of individuals and independent "governances," as well as by companies, organizations and governments.

In some examples, various types of Teleportal Devices automatically discover their appropriate connections and are configured automatically for their owner's account(s), identity(ies) and profile(s). Advance or separate knowledge of how to turn on, configure, login and/or use devices, services and new capabilities successfully is reduced substantially by automation and/or delivery of task-based knowledge during installation and use. In addition, an adaptable consistent user interface is provided across Teleportal Devices. In some examples a visible model of "see the best and most successful choices" then "try them and you'll succeed in using them" then "if you fail keep going and you'll be shown how" is available like electricity, as a new type of utility—to enable "fast follower" processes so more may reach the higher levels of success sooner. While the nation state and governments continue, in some examples multiple simultaneous types of "governances" provide options that a plurality of individuals may join, leave, or have different types of associations with multiple governances at one time. Three of a plurality of types of governances are illustrated herein including an IndividualISM in which each member has virtual personal sovereignty and self-control (including in some examples the right to establish a plurality of virtual identities, and own the work, properties, incomes and assets from their multiple identities); a CorporatISM in which one or a group of corporations may sell plans that include targeted levels of personal success (such as an "upward mobility lifestyle") across a (potentially broad) package of products and services consumption levels (that can include in some examples housing, transportation, financial services, consumer goods, lifelong education, career success, wealth and lifestyle goals, etc.); a WorldISM in which a central governance supports and/or requires a set of values (that may include in some examples environmental practices, beliefs, codes of conduct, etc.) that span national boundaries and are managed centrally; or different types of new and potentially useful types of governances (as may be exemplified by any field of focused interest and activity such as photography, fashion, travel, participating in a sport, a non-mainstream lifestyle such as nudism, a parent's group such as local PTA, a type of charity such as Ronald McDonald Houses, etc.). While life spans are limited by human genetics, in some examples individuals have the equivalent of life extension by being able to enjoy multiple identities (that is, multiple lives) at one time during their one life time. Multiple identities also provide greater freedom and economic independence by using multiple identities that may each own assets, businesses, etc. in addition to a single individual's normal job and salary, or have multiple identities that may be used to try and enjoy multiple lifestyles. Within one's limited life span, multiple identities provide each person the opportunity to experience multiple "lives" (in some examples multiple lifestyles and multiple incomes) where each identity can be created, changed, or eliminated at any time, with the potential for an additional identity(ies) or group of identities to become wealthier, adventurous and/or happier than one's everyday typical wage-earning "self". In some examples human success is an engineered dynamic process that operates to help a plurality of those who are connected by means of an agnostic infrastructure whose automated and self-improving human success systems range from bottom-up support of individuals who operate independently, to top-down determination and "selling" of collective goals by new types of "Governances" that seek to influence and control groups (in some examples by IndividualISMs, CorporatISMs, WorldISMs, or other types of Governances). In some examples individuals and groups may leap ahead with a visible "fast follower" process: Humanity's status and results in a plurality of areas are reported publicly and visibly so that a plurality of ways that people and groups choose and construct this Alternate Reality are known and visible, including a plurality of their "best" and most successful activities, devices, actions, goals, rates of success, results and satisfaction (that is, more of what we choose, do and achieve is tracked, measured, reported visibly, etc.) so that people may know a plurality of the choices, products, services, etc. work best, and a plurality of individuals and groups may use this reporting. There are direct processes for accessing the same choices, settings, configurations, etc. that produce the "best" successes so that others may copy them, try them and switch to those that work best for them, based on what they want to achieve for themselves, their families, those with whom they enjoy Shared Planetary Life Spaces, etc.

In sum, while today's current reality is the background (including especially physical reality and its networked electronic devices environment), there are substantial alterations in this Alternate Reality. A "human success" Expandaverse parallels fiction by providing technologies from a different reality that operate by different assumptions and principles, yet it is contemporary to our reality in that it describes how to use current and new technology to build this Alternate Reality, contained herein and in various patent applications, including a range of devices and components—together an Alternate Reality Teleportal Machine (ARTPM).

HISTORICAL BACKGROUND: In our current reality and timeline, by 1982 the output per hour worked in the USA had become 10 times the output per hour worked 100 years before (Romer 1990, Maddison 1982). For nearly 200 years economic, scientific and technological advances have produced falling costs, increasing production and scale that has exploded from local to global levels across a plurality of economic areas of creation, production and distribution and a plurality of economies worldwide. Scarcity has been made obsolete for raw materials like rubber and wood as they have been replaced by growing ranges of invented materials such as plastics, polymers and currently emerging nano-materials. Even limited commodities such as energy may yield to abundant sources such as solar, wind and other renewable sources as innovations in these fields may make energy more efficient and abundant. More telling, the knowledge resources and communication networks required to drive progress are advancing because the means to copy and re-use digital bits are transforming numerous industries whose products or operating knowledge may be stored and transmitted as digital bits.

Economic theory is catching up with humanity's historic rise of material, energy, knowledge, digital and other types of abundance. Two of the seminal advances are considered Robert Solow's "A Contribution to the Theory of Economic Growth" (Solow, 1956) and Paul Romer's "Endogenous Technological Change" (Romer 1990). The former three factors of production (land, labor and capital with diminishing returns) have been replaced in economic theory by people (with education and skills), ideas (inventions and advances), and things (traditional inputs and capital). These new factors of production describe an economic growth model that includes accelerating technological change, intellectual property, monopoly rents and a dawning realization that widely advancing prosperity might become possible for most of humanity, not just for some.

The old proverb is being rewritten and it is no longer "Give a man a fish and you feed him for today, but teach a man to fish and you feed him for a lifetime." Today we can say "reinvent fishing and you might feed the world" and by that mean invent new means of large-scale ocean fishing, reduce by-catch from as much as 50% of total catches to reduce destruction of ocean ecosystems, invent new types of fish farming, reduce external damage from some types of fish farming, improve refrigeration throughout the fish distribution chain, use genetic engineering to create domesticated fish, control overfishing of the oceans, develop hatcheries that multiply fish populations, or invent other ways to improve fishing that have never been considered before—and then deliver those advances to individuals, corporations and governments; and from small groups to societies throughout the global economy. Another way to say this is the more we invent, learn and implement successfully at scale, the more people can produce, contribute and consume abundantly. Comparing the past two decades to the past two centuries to civilization's history before that shows how increasing the returns from knowledge transforms the speed and scale of widespread transformations and economic growth opportunities available.

In spite of our progress, this historic shift from scarcity to abundance has been both unequal and inadequate in its scope and speed. There are inequalities between advanced economies, emerging economies and poor undeveloped countries. In every nation there are also huge income inequalities between those who create this expanding abundance as members of the global economy, and those who do local work at local wages and feel bypassed by this growth of global wealth. In addition, huge problems continue to multiply such as increasingly expensive and scarce energy and fuels, climate change, inadequate public education systems, healthcare for everyone, social security for aging populations, economic systems in turmoil, and other stresses that imply that the current rate of progress may need to be greater in scope and speed, and dynamically self-optimizing so it may become increasingly successful for everyone, including those currently left behind.

This "Alternate Reality Teleportal Machine" (ARTPM) "offers the "Alternate Reality" suggestion that if our goal is widespread human success and economic prosperity, then the three new factors of production are incomplete. A fourth factor—a Teleportal Machine (TPM) with components described herein in some examples, a Teleportal Utility (herein TPU), an Active Knowledge Machine (herein AKM), an Alternate Realities Machine (herein ARM), and much more that is exemplified herein—conceptually remake the world into one successful room, with at least some automated flows of a plurality of knowledge to the "point of need" based on each person's, organization's and society's activities and goals; with tracking and visibility of a plurality of results for continuous improvements. If this new TPM were added to "people, ideas and things" then the new connections and opportunities might actually enable part or more of this Alternate Reality to provide these types of economic and quality of life benefits in our current reality—our opportunities for personal success, personal economic prosperity and many specific advances might be accelerated to a new pace of growth, with new ways that might help replace scarcity with abundance and wider personal success.

CONNECTIONS: To achieve this examples of TPM components—Teleportal Devices (herein TP Devices)—reinvent the window and the "world" which its observers see. Instead of only looking through a wall to the scene outside a room, the window is reinvented as a "Local Teleportal" (LTP, which is a fixed Teleportal) or a "Mobile Teleportal" (MTP, which is a portable Teleportal) that provide two-way connections for every user with the world, and with those who also have a Teleportal Device, along with connections to "Remote Teleportals" (RTP) that provide access to remote locations (herein "Places") that deliver a plurality of types of real-time and recorded video content from a plurality of locations. This TPM also includes Virtual Teleportals (VTP) which can be on devices like cell phones, PDAs, PCs, laptops, Netbooks, tablets, pads, e-readers, television set-top boxes, "smart" televisions, and other types of devices whether in current use or yet to be developed and turns a plurality of Subsidiary Devices into Alternate Input Devices (herein AIDs)/Alternate Output Devices (herein AODs; together AIDs/AODs). The TPM also includes integrated networks for applications in some examples a Teleportal Shared Space Network (or TPSSN), the ability to run applications of a plurality of types in some examples such as social networking communications or access to multiple types of virtual realities (Teleportal Applications Network or TPAN), personal broadcasting for communicating to groups of various sizes (Teleportal Broadcast Network or TPBN), and connection to various types of devices. The TPM also includes a Teleportal Network (TPN) to integrate a plurality of components and services in some examples Shared Planetary Life Space(s) (herein SPLS), an Alternate Realities Machine (ARM) to manage various boundaries that create these separate realities, and a Teleportal Utility (herein TPU) that enables connections, membership, billing, device addition, configuration, etc. Together and with ARTPM components these enable new types of applications and in some examples is another component, the Active Knowledge Machine (AKM), which adds automated information flows that deliver to users of Teleportal Machines and devices (as defined herein) the knowledge, information and entertainment they need or want at the time and place they need it. Another of some combinatorial examples is the ARM which provides multiple types of filters, protections and paywalls so the prevailing "common" culture is under each person's control with both the ability to exclude what is not wanted, and an optional requirement that each person must be paid for their attention rather than required to provide it for free. Together, this TPM and its components turn each individual and what he or she is doing into a dynamic filter for the "active knowledge," entertainment and news they want in their lives, so that every person can take larger steps toward the leading edge of human achievement in a plurality of areas, even when they try something they have never done or known before. In this Alternate Reality, human knowledge, attention and achievement are made controlled, dynamic, deliverable and productive. Humanity's knowledge, especially, is no longer static and unuseful until it has been searched for, discovered, deciphered and applied—but instead is turned into a dynamic resource that may increase personal success, prosperity and happiness.

ACCELERATIONS: Economic growth research may confirm the potential for this TPM alternative reality. Recent economic research has calculated that the cross-country variation in the rate of technology adoption appears to account for at least one-fourth of per capita income differences (Comin et al, 2007 and 2008). That is, when different countries have different rates of adopting new technologies their economic growth rates are different because new technologies raise the level of productivity, production and consumption to the level of the newer technologies. Thus, the TPM is explicitly designed to harness the potentials for making personal, national and worldwide economic growth actually speed up at a plurality of personal and group economic levels by improving the types of communications that produce higher rates of personal and group successes and thereby economic growth—the production, transmission and use of the ideas and information that improves the outcomes and results that can be achieved from various types of activities and goals.

The history of technology also demonstrates that a new technology may radically transform societies. The development of agriculture was one of the earliest examples, with nomadic humans becoming settled farming cultures. New agricultural surpluses gave rise to the emergence of governments, specialized skills and much more. Similarly, the invention of money altered commerce and trade; and the combination of writing and mathematics altered inventories, architecture, construction, property boundaries and much more. Scientific revolutions like the Renaissance altered our view of the cosmos which in turn changed our understanding of who and what we are. These transformations continue today, with frequent developments in digital technologies like the Internet, communications, and their many new uses. In the Alternate Reality envisioned by the TPM, a plurality of current devices could be employed so individuals could automatically receive the know-how that helps them succeed in their current step, then succeed in their next step, and the step after that, until through a succession of successful steps they and their children may have new opportunities to achieve their lifes' goals. These can also focus some or much of their Active Knowledge Machine deliveries on today's crises such as energy, climate change, supporting aging populations, health care, basic and lifetime education so previously trained generations can adapt to new and faster changes, and more. In addition, the TPU (Teleportal Utility) and TPN (Teleportal Network) provide flexible infrastructure for adding new devices and capabilities as components that automatically deliver AKM know-how and entertainment, based on what each person does and does not want (through their AKM boundaries), across a range of devices and systems.

Some examples of this expanding future include e-paper on product packaging and various devices (such as but not exclusively Teleportal Packaging or TPP); teleportal devices in some examples mobile teleportal devices, wearable glasses, portable projectors, interactive projectors, etc. (such as but not exclusively Mobile Teleportals or MTPs); networking and specialized networks that may include areas like lifetime education or travel (such as but not exclusively Teleportal Networks or TPNs); alert systems for areas like business events, violent crimes or celebrity sightings (such as but not exclusively Teleportal Broadcast and Application Networks TPBANs); personal device awareness for personal knowledge deliveries to one's currently active and preferred devices (such as but not exclusively the Active Knowledge Machine or AKM); etc.

Together, these Alternate Reality Teleportal Machine (ARTPM), including the Active Knowledge Machine (AKM) (as well as the types of future networks and additions described herein) imply that new types of communications may lead to more delivery and use of the best information and ideas that produce individual successes, higher rates of economic growth, and various personal advances in the Quality of Life (QoL). In some examples during the use of devices that require energy, users can receive the best choices to save energy, as well as the know-how and instructions to use them so they actually use less energy—as soon as someone switches to a new device or system that uses less energy, from their initial attempt to use it through their daily uses, they may automatically receive the instructions or know-how to make a plurality of difficult step easier, more successful, etc.

Historically, humanity has seen the most dramatic improvements in its living conditions and economic progress during the most recent two centuries. This centuries-long growth in prosperity flies in the face of economists' dogma about scarcity and diminishing returns that dominated economic theory while the opposite actually occurred. Abundance has grown so powerful that at times it almost seemed to rewrite "Use it up or do without" into "Throw it out or do without.". With this proven record of wealth expansion, abundance is now the world's strongest compulsion and most individuals' desired economic outcome for themselves and their families. Now as the micro- and macro-concepts of the TPM become clear it prompts the larger question of whether an Alternate Reality with widespread growth toward personal success and prosperity might be explicitly designed and engineered. Can a plurality of factors that produce and deliver an Alternate Reality that identifies and drives advances be specified as an innovation that includes means for new devices, systems, processes, components, elements, etc.? Might an Alternate Reality that explicitly engineers an abundance of human success and prosperity be a new type of technology, devices, systems, utility(ies), presence, and infrastructure(s)?

Social and interpersonal activities create awareness of problems and deliver advances that come from "rubbing elbows." This is routinely done inside a company, on a university campus, throughout a city's business districts such as a garment district or finance center, in a creative center like Silicon Valley, at conferences in a field like pharmaceuticals or biotech, by clubs or groups in a hobby like fishing or gardening, in areas of daily life like entertainment or public education, etc. Can this now be done in the same ways worldwide because new knowledge is both an input to this process and an output from it? In some examples the TPM and AKM are designed to transform the world into one room by resizing our sphere of interpersonal contacts to the scale of a Shared Planetary Life Space(s) plus Active Knowledge, multiple native and alternate Teleportal devices, new types of networks, systems and infrastructures that together provide access to people, places, tools, resources, etc. Could these enable one shared room that might simultaneously be large enough and small enough for everyone to "rub elbows?"

Economics of scale apply. Advances in know-how can be received and used by a plurality simultaneously without using them up—in fact, more use multiplies the value of each advance because the fixed cost of creating a new advance is distributed over more users, so prices can be driven down faster while profits are increased—the same returns to scale that have helped transform personal lives and create developed economies during the last two centuries. The bigger the market the more money is made: Sell one advance at a high price and go broke, sell a thousand that are each very expensive and break even, but sell millions at a low price and get rich while helping spread that advance to many customers. Abundance becomes a central engine of greater personal success, collective advances, and widely enjoyed welfare. The Alternate Reality described herein is designed to bring into existence a similar wealth of enjoyment from human knowledge, abundance and entertainment—by introducing new means to expand this process to new fields and move increasing numbers of individuals and companies to humanity's leading edge at lower prices with larger profits as we "grow forward."

BUSINESS: This TPM also addresses the business issue of enabling (an optional) business evolution from today's dominant silo platforms (such as mobile phone networks, PCs, and cable/satellite television) to a world of integrated and productive Teleportal connectivity. Some current communications and product platforms are supported by business models that lock in their customers. The "network industries" that lock in customers include computers (Windows), telecommunications (cell phone contracts, landline phones, networks like the Internet), broadcasting/television delivery (cable TV and satellite), etc. In contrast, the TPM provides the ability to support both current lock-in as Subsidiary Devices and new business models, permitting their evolution into more effective devices and systems that may produce business growth—because both currently dominant companies and new companies can use these advances within existing business models to preserve customer relationships while entering new markets with either current or new business models—that choice remains with each corporation and vendor.

Whether the business models stay the same or evolve, there are potentially large technology changes and outcome shifts in an Alternate Reality. We started with a culture built on printed books and newspapers, landline telephones, and television with only a few oligopolistic networks. Digital communications and media technologies developed in separate silos to become PCs with individual software applications, the Internet silo, cell phones, and televisions with a plurality of channels and (gradually) on-demand TV. This has produced a "three-screen" marketplace whereby many now use the three screens of computers, televisions and cell phones—even though they are fairly separate and only somewhat interconnected. The rise of the Internet has lead to widespread personal creation and distribution of personalized news (blogs, micro-blogging, citizen journalism, etc.), videos, entertainments, product reviews, comments, and other types of content that are based on individual tastes or personal experience, rather than institutional market power (such as from large entertainment or news companies, or major advertisers). Even without a TPM there is a growing emergence of new types of personal-based communications devices, uses, markets, interconnections and infrastructure that break from the past to create a more direct chain from where we each of us wants to go directly to the outcomes people want—rather than a collective "spectacle culture" and brands to which people are guided and limited. With the TPM, however, goals and intentions are surfaced as implicit in activities, actual success is tracked, gaps are identified and active knowledge deliveries help a plurality cross the bridge from desires to achievements.

COGNITION: Also a focus in the TPM's Alternate Reality, different cognitive and communication styles are emphasized such as more visual screens use with less use of paper. At this time, there may be a change along these lines which is leading to the decline of paper-dependent and printing-dependent industries such as newspapers and book publishing, and the rise of more digital, visual and new media channels such as e-readers, electronic articles, blogging, twitter, video over the Internet and social media that allows personal choices, personal expertise and personal goals to replace institution-driven profit-focused world views, with skimming of numerous resources (by means such as search engines, portals, linking, navigation, etc.). This new cognitive style replaces expensive corporate marketing and news media "spectacle" reporting that compel product-focused lifestyles, information, services, belief systems content, and the creation or expansion of needs and wants in large numbers of consumers. In this Alternate Reality there are optional transitions in some examples from large sources toward individual and one's chosen group sources; from one "self" per person to each person having (optional) multiple identities; from mass culture to selective filtering of what's wanted (even into individually controlled Shared Planetary Life Spaces, whose boundaries are attached to one or a plurality of multiple identities); from reading and interpreting institutional messages to independent and individual creation and selection of personally relevant information; from fewer broadcasters to potentially voluminous resources for recording, reinterpreting and rebroadcasting; along with large and more sensory-based (headline, pictorial, video and aural) cognitive styles with "always on" digital connectivity that includes: More scanning and skimming of visual layouts and visual content. A plurality of available resources and connections from LTPs (Local Teleportals), RTPs (Remote Teleportals), TPBNs (Teleportal Broadcast Networks created and run by individuals), TPANs (Teleportal Application Networks), remote control of electronic sources and devices through RCTP (Remote Control Teleportaling) by direct control via a Teleportal Device or through Teleportals located in varied locations, personal connections via MTPs (Mobile Teleportals) and VTPs (Virtual Teleportals), and more. Increasing volume, variety, speed and density of visual information and visual media; including more frequent simultaneous use of multiple media with shorter attention spans; within separately focused and bounded Shared Planetary Life Spaces. Growing replacement of long-form printed media such as newspapers and books in a multi-generation transition that may turn long-form content printing (e.g., longer than 3-5 pages) into merely one type of specialized media (e.g., paper is just one format and only sometimes dominant). Growing replacement of "presence" from a physical location to one's chosen connections, with most of those connections not physically present at most times, but instead communications-dependent through a variety of devices and media. The evolution of devices and technologies that reflect these cognitive and perceptual transformations, so they can be more fully realized. And more.

In sum, this Alternate Reality may provide options for the evolution of our cognitive reality with new utility(ies), new devices, new life spaces and more—for a more interactive digital reality that may be more successful, to provide the means for achieving and benefiting from new types of economic growth, quality of life improvements, and human performance advantages that may help solve the growing crises of our timeline while replacing scarcity and poverty with an accelerated expansion of abundance, prosperity and the multiple types of happiness each person chooses.

In some examples the ARTPM provides an Alternate Reality that integrates advancing know-how, resources, devices, learning, entertainment and media so that a plurality of users might gain increasing capabilities and achievements with increased connections, speed and scope. From the viewpoint of an Alternate Reality Teleportal Machine (ARTPM) in some examples this is designed to provide new ways to advance economically by delivering human success to a plurality of individuals and groups. It also includes integration of a plurality of devices, siloed business/product platforms, and existing business models so that (r) evolutionary transformations may potentially be achieved.

RAMIFICATIONS: In this "Alternate Reality's" timeline, humanity has embarked on a rare period of continuous improvements and transformations: What are devices (including products, equipment, services, applications, information, entertainment, networks, etc.)? Increasing ranges and types of "devices" are gaining enough computing, communications and video capabilities to re-open the basic definitions of what "devices" are and should become. A historic parallel is the transformation of engines into small electric motors, which then disappeared into numerous products (such as appliances), with the companion delivery of universal electric power by means of standardized plugs and wall sockets—making the electric motor an embedded, invisible tool that is unseen while people do a wide ranges of tasks. The ARTPM's implication that human success may undertake a similar evolution and be delivered throughout our daily lives as routinely as electricity from a wall socket may seem startling, but it is just one part. Today's three main screens are the computer, cell phone and television. In the TPM Alternate Reality these three screens may remain the same and fit that environment, or they may disappear into integrated parts of a different digital environment whose Teleportal Devices may transform the range and scope of our personal perception and life spaces, along with our individual identities, capacities and achievements.

The TPM's Alternate Reality provides dynamic new connections between uses and needs with vendors and device designers—a process herein named "AnthroTectonics." New use-based designs are surfaced as a by-product from the AKM, ARM, TPU and TPM, and systems for this are enumerated. In some examples selling bundles of products and services with targeted levels of success or satisfaction may result, such as in some examples a governance's lifestyle plan for "Upward Mobility to Lifetime Luxury" that guides one's consumption of housing, transportation, financial services, products, services, and more—along with integrated guidance in achieving many types of personal and career goals successfully. Together, these and other ARTPM advances may provide expanded goals, processes and visibly reported results; with quantified collective knowledge and desires resulting in new types of digitally connected relationships in some examples between people, vendors, governances, etc. The companies and organizations that capture market share by being able to use these new Alternate Reality systems and their resulting devices advances can also control intellectual property rights from many new usage-driven designs of numerous types of devices, systems, applications, etc. The combination of these competitive advantages (ARTPM systems-created first-mover intellectual properties, numerous advances in devices and processes, and the resulting deeper relationships between customers and vendor organizations) may afford strong new commercial opportunities. In some examples those customers may receive new successes as a new normal part of everyday life—with vendors competing to create and deliver personal and/or lifetime success paths that capture family-level customer relationships that last decades, perhaps throughout entire lives.

This potential "marriage" between powerful corporations, new ways to "own" markets, and systems and processes that attach corporations with their customers' lifetime goals could lead to a growing realization that an Alternate Reality option may exist for our current reality, namely: "If you want a better reality, choose it."

Because our current reality repeatedly suffers serious crises, at some future crisis the combination of powerful corporations who are able to deliver a growing range of human successes and the demands of a larger crisis may connect. Could the fortunes of those global companies rise at that time by using their new capabilities to help drive and deliver new types of successes? Could the fortunes of humanity—first in that crisis and then in its prosperity after that—rise as well?

This innovation's multiple components were created as steps toward a new portfolio that might demonstrate that humanity is becoming able to create and control reality—actually turning it into multiple realities, multiple identities, multiple Shared Planetary Life Spaces, and more—with one of the steps into this future an attempt to deliver a more connected and success-focused stage of history—one where the dreams and choices of individuals, groups, companies, countries and others may pursue self-realization. When the transformations are considered together, each person may gain the ability to specify multiple realities along with the ability to switch between them—more than humanity gaining control of reality, this may be the start of each person's control over it.

Is it possible that a new era might emerge when one of the improvement options could be: "If you want a better reality, switch it."

SUMMARY

In this document, we sometimes use certain phrases to refer to examples or broad concepts or both that relate to corresponding phrases that appear in current and future claims. We do not mean to imply that there is necessarily a direct and complete overlap in their meaning. Yet, roughly speaking, the reader can infer an association between the following: "Alternate Reality" or "Expandaverse" and the broad concepts to which at least some of the claims are directed; "altered reality" and Alternate Reality; "Shared Planetary Life Spaces" and "virtual places" and "digital presence"; "Alternate Reality Teleportal Machine" and a wide variety of devices, resources, networks, and connections; "Utility" and a publicly accessible network, network infrastructure, and resources, and in some cases cooperating devices that use the network, the infrastructure, and the resources; "Active Knowledge Machine" and "active knowledge management facility"; "Active Knowledge Interactions" and active knowledge accumulation and dissemination; "Active Knowledge" and information associated with activities and derived from users and for which users have goals; "Teleportal Devices" or "TP Devices" and electronic devices that are used at geographically separate locations to acquire and present items of content; "Alternate Realities Machine" and a facility to manage altered realities; "Quality of Life (QoL)" and goals, interests, successes, and combinations of them.

In general, in an aspect, electronic systems acquire items of audio, video, or other media, or other data, or other content, in geographically separate acquisition places. A publicly available set of conventions, with which any arbitrary system can comply, is used to enable the items of content to be carried on a publicly accessible network infrastructure. On the publicly accessible network infrastructure, services are provided that include selecting, from among the items of content, items for presentation to recipients through electronic devices at other places. The selecting is based on (a) expressed interests or goals of the recipients, to whom the items will be presented, and (b) variable boundary principles that encompass boundary preferences derived both from sources of the items of content and from the recipients to whom the items are to be presented. The variable boundary principles define a range of regimes for passing at least some of the items to the recipients and blocking at least some of the items from the recipients. The selected items of content are delivered to the recipients through the network infrastructure to the devices at the other places in compliance with the publicly available set of conventions. At least some of the selected items are presented to the recipients at the presentation places automatically, continuously, and in real time, putting aside the latency of the network infrastructure.

Implementations may include one or more of the following features. The electronic systems include cameras, video cameras, mobile phones, microphones, speakers, and computers. The electronic systems include software to perform functions associated with the acquisition of the items. The publicly available set of conventions also enable the items of content to be processed on the publicly accessible network infrastructure. The services provided on the publicly accessible network infrastructure are provided by software. At least one of the actions of (a) using electronic systems to acquire items in acquisition places, (b) using a publicly available set of conventions, (c) providing services, (d) delivering selected items, and (e) presenting some of the selected items, is performed by resources that include hardware, software, or a combination of hardware and software, that are part of the network infrastructure, part of the electronic devices, or part of presentation devices at the presentation places, or a combination of them. At least some of the acquisition places are also presentation places. The resources include controller resources that remotely control other controlled resources. The controlled resources include at least one of computers, television set-top boxes, digital video recorders (DVRs), and mobile phones. The usage of at least some of the resources is shared. The shared usage may include remote usage, local usage, or networked usage. The items are acquired by people using resources. At least one of the actions is performed by at least one of the resources in the context of a revenue generating business model. The revenue is generated in connection with at least one of (a) using electronic systems to acquire items in acquisition places, (b) using a publicly available set of conventions, (c) providing services, (d) delivering selected items, (e) presenting some of the selected items, (f) or advertising in connection with any of them. The revenue is generated using hardware, software, or a combination of hardware and software, that are part of the network infrastructure, part of the electronic devices, or part of presentation devices at the presentation places, or a combination of them.

In general, in an aspect, items of audio, video, other media, or other data, or other content are acquired from sources located in geographically separate places. The items of content are communicated to a network infrastructure. On the network infrastructure, services are provided that include selecting, from among the acquired items of content, items for presentation to recipients at other places, the selecting being based on (a) expressed interests or goals of the recipients to whom the items will be presented, and (b) variable boundary screening principles that are based on source preferences derived from the sources of the content and recipient preferences derived from recipients to whom the items are to be presented. The items of content are transmitted to the other places, and at least some of the selected items are presented to the recipients at the other places automatically, continuously, and in real time, relative to their acquisition, taking account of time required to communicate, select, and transmit the items.

Implementations may include one or more of the following features. At least one of the actions of (a) acquiring items, (b) communicating items, (c) providing services, (d) transmitting items, and (e) presenting some of the selected items, is performed by resources that include hardware, software, or a combination of hardware and software, that are part of the network infrastructure, part of the electronic devices, or part of presentation devices at the presentation places, or a combination of them. The expressed interests or goals of the recipients, to whom the items will be presented, define characteristics of an alternate reality, relative to an existing reality that is represented by real interactions between those recipients and the electronic devices located at the presentation places. The acquired items of content include (a) active knowledge, associated with activities, derived from users of at least some of the electronic systems at the separate places, for which the users have goals, (b) information about success of the users in reaching the goals, and (c) guidance information for use in guiding the users to reach the goals, the guidance information having been adjusted based on the success information, and the adjusted guidance information is presented to the users. The electronic systems include digital cameras. The activities include actions of the users on the electronic systems, and the information about success is generated by the electronic systems as a result of the actions. The guidance information is presented to the users through the electronic systems. The guidance information is presented to the users through systems other than the electronic systems. The presenting of the selected items to the recipients at the presentation places and the acquisition of items at the acquisition places establish virtual shared places that are at least partly real and at least partly not real, and the recipients are enabled to experience having presences in the virtual places. The network infrastructure includes an accessible utility that is implemented by devices, can communicate the items of content from the acquisition places to the presentation places based on the conventions, and provides services on the network infrastructure associated with receiving, processing, and delivering the items of content. The items are acquired at digital cameras in the acquisition places, the interests and goals of the recipients relate to photography. The recipients include users of the digital cameras, and the selected items that are presented to the recipients include information for taking better photographs using the digital cameras. The recipients are designers of digital cameras, and the selected items that are presented to the designers include information for improving designs of the digital cameras. The resources provide governances. The items relate to activities at the acquisition places and the items selected for presentation to recipients at the other places concern a governance for at least one of the recipients. The variable boundary principles encompass, for each of the recipients to whom the items are to be presented, more than one identity. Coordinated globally accessible directories of the items of content are maintained, the communications of the items of content, the places, the recipients, the interests, the goals, and the variable boundary principles.

In general, in an aspect, a method includes using electronic devices at geographically separate locations to acquire items of content and to present the items of content to geographically separate participants as part of virtual places, each of which is persistent and at least partially remote with respect to the participants, and using one or more presence management facilities to enable two or more of the participants to be present in one or more of the virtual places at any time, continuously, and simultaneously.

Implementations may include one or more of the following features. One or more background management facilities are used to manage the items of content in a manner to present and update background contexts for the virtual places as experienced by the participants. One or more of the background management facilities operates at multiple locations. The different background contexts are presented to different participants in a given virtual place. One or more of the background management facilities changes one or more background contexts of a virtual place by changing one or more locations of the background context. The background context of a virtual place includes commercial information. The background context of a virtual place includes any arbitrary location. The background context includes items of content representing real places. The background context includes items of content representing real objects. The real objects include advertisements, brands of products, buildings, and interiors of buildings. The background context includes items of content representing non-real places. The background context includes items of content representing non-real objects. The non-real objects include CGI advertisements, CGI illustrations of brands of products, and buildings. One or more of the background management facilities responds to a participant's indicating items of content to be included or excluded in the background context. The participant indicates items of content associated with the participant's presence that are to be included or excluded in the participant's presence as experienced by other participants. The participant indicates items of content associated with another participant's presence that are to be included or excluded in the other participant's presence as experienced by the participant. One or more of the background management facilities presents and updates background contexts as a network facility. The background contexts are updated in the background without explicit action by any of the participants. One or more of the background management facilities presents and updates background contexts without explicit action by any of the participants. One or more of the background management facilities presents and updates background contexts for a given one of the virtual places differently for different participants who have presences in the virtual place. One or more of the background management facilities responds to at least one of: participant choices, automated settings, a participant's physical location, and authorizations. One or more of the background management facilities presents and updates background contexts for the virtual places using items of content for partial background contexts, items of content from distributed sources, pieced together items of content, and substitution of non-real items of content for real items of content. One or more of the background management facilities includes a service that provides updating of at least one of the following: background contexts of virtual places, commercial messages, locations, products, and presences. One or more of the presence management facilities receives state information from devices and identities used by a participant and determines a state of the presence of the participant in at least one of the virtual places. One or more of the presence management facilities receives state information from devices and identities used by a participant and determines a state of the presence of the participant in a real place. The presence state is made available for use by presence-aware services. The presence state is updated by the presence management facility. The presence state includes the availability of the user to be present in the virtual place. One or more of the presence management facilities controls the visibility of the presence states of participants. One or more of the presence management facilities manages presence connections automatically based on the presence states.

In general, in an aspect, a method includes using electronic devices at geographically separate locations to acquire items of content associated with virtual events that have defined times and purposes and occur in virtual places, and to present the items of content to geographically separate participants as part of the virtual events in the virtual places, each of the virtual places and virtual events being persistent and at least partially remote with respect to the participants, and using a virtual event management facility to enable two or more of the participants to have a presence at one or more of the virtual events at any time, continuously, and simultaneously.

Implementations may include one or more of the following features. The virtual events include real events that occur in real places and have virtual presences of participants. The virtual events include elements of real events occurring in real time in real locations. The purposes of the events include at least one of business, education, entertainment, social service, news, governance, and nature. The participants include at least one of viewers, audience members, presenters, entertainers, administrators, officials, and educators. A background management facility is used to manage the items of content in a manner to present and update background contexts for the events as experienced by participants. One or more virtual event management facilities manages an extent of exposure of participants in the events to one another. The participants can interact with one another while present at the events. The participants can view or identify other participants at the events. One or more virtual event management facilities is scalable and fault tolerant. One or more of the presence management facilities is scalable and fault tolerant. The virtual event management facility enables participants to locate virtual events using at least one of: maps, dashboards, search engines, categories, lists, APIs of applications, preset alerts, social networking media, and widgets, modules, or components exposed by applications, services, networks, or portals. The virtual event management facility regulates admission or participation by participants in virtual events based on at least one of: price, pre-purchased admission, membership, security, or credentials.

In general, in an aspect, a method includes using electronic devices at geographically separate locations to acquire items of content and to present the items of content to geographically separate participants as part of virtual places, each of which is persistent and at least partially local and at least partially remote with respect to the participants, using a presence management facility to enable two or more of the participants to be present in one or more of the virtual places at any time, continuously, and simultaneously, the presence management facility enabling a participant to indicate a focus for at least one of the virtual places in which the participant has a presence, the focus causing the presence of at least one of the other participants to be more prominent in the virtual place than the presences of other participants in the virtual place, as experienced by the participant who has indicated the focus.

Implementations may include one or more of the following features. Presenting items of content to geographically separate participants includes opening a virtual place with all of the participants of the virtual place present in an open connection. In the opened connection, one or more participants focuses the connection so they are together in an immediate virtual space. The focus causes the one participant to be more easily seen or heard than the other participants.

In general, in an aspect, a method includes enabling a participant to become present in a virtual place by selecting one identity of the participant which the user wishes to be present in the virtual place, invoking the virtual place to become present as a selected identity, indicating a focus for the virtual place to cause the presence of at least one other participant in the virtual place to be more prominent than the presences of other participants in the virtual place, as experienced by the participant who has indicated the focus, Implementations may include one or more of the following features. The identity is selected manually by the participant. The identity is selected by the participant using a particular device to become present in the virtual place. The identities include identities associated with personal activities of the participant and the virtual places include places that are compatible with the identities. The participant includes a commercial enterprise, the identities include commercial contexts in which the commercial enterprise operates, and the virtual places include places that are compatible with the commercial contexts. The participant includes a participant involved in a mobile enterprise, the identities include contexts involving mobile activities, and the virtual places include places in which the mobile activities occur. The participant selects a device through which to become present in the virtual place. The focus is with respect to categories of connection associated with the presences of the participants in the virtual places. The categories include at least one of the following: multimedia, audio only, observational only, one-way only, and two-way.

In general, in an aspect, a method includes using electronic devices at geographically separate locations to acquire items of content and to present the items of content to geographically separate participants as part of virtual places, each of which is persistent and at least partially local and at least partially remote with respect to the participants, and using a connection management facility to manage connections between participants with respect to their presences in the virtual places.

Implementations may include one or more of the following features. The connection management facility opens, maintains, and closes connections based on devices and identities being used by participants. The connections are opened, maintained, and closed automatically. The connection management facility opens and closes presences in the virtual places as needed. The connection management facility maintains the presence status of identities of participants in the virtual places. The connection management facility focuses the connections in the virtual places.

In general, in an aspect, a method includes using electronic devices at geographically separate locations to acquire items of content and to present the items of content to geographically separate participants as part of virtual places, each of which is persistent and at least partially local and at least partially remote with respect to the participants, and using a presence facility to derive and distribute presence information about presence of the participants in the virtual places.

Implementations may include one or more of the following features. The presence information is derived from at least one of the following: the participants' activities with the devices, the participants' presences using various identities, the participants' presences in the virtual places, and the participants' presences in real places. The presence facility responds to participant settings and administrator settings. The settings include at least one of: adding or removing identities, adding or removing virtual places, adding or removing devices, changing presence rules, and changing visibility or privacy settings. The presence facility manages presence boundaries by managing access to and display of presence information in response to at least one of: rules, policies, access types, selected boundaries, and settings.

In general, in an aspect, a method includes using electronic devices at geographically separate locations to acquire and present items of content, and using a place management facility to manage the acquisition and presentation of the items of content in a manner to maintain virtual places, each of which is persistent and at least partially local and at least partially remote, and in each of which two or more participants can be present at any time, continuously, and simultaneously.

Implementations may include one or more of the following features. The items of content include at least one of: a real-time presence of a remote person, a real-time display of a separately acquired background such as a place, and a separately acquired background content such as an advertisement, product, building, or presentation. The presence is embodied in at least one of video, images, audio, text, or chat. The place management facility does at least one of the following with respect to the items of content: auto-scale, auto-resize, auto-align, and in some cases auto-rotate. The auto activities include participants, backgrounds, and background content. One or more place management facilities enable the participant to be present in the remote part of a virtual place from any arbitrary real place at which the participant is present. The background aspect of the virtual place is presented as a selected remote place that may be different from the actual remote part of the virtual place. One or more of the place management facilities controls access by the participants to each of the virtual places. One or more of the place management facilities controls visibility of the participants in each of the virtual places. The presentation of the items of content includes real-time video and audio of more than one participant having presences in a virtual place. The presentation of the items of content includes real-time video and audio of one participant in more than one of the virtual places simultaneously. The access is controlled electronically, physically, or both, to exclude parties. The access is controlled to regulate presences of participants at events. The access is controlled using at least one of: white lists, black lists, scripts, biometric identification, hardware devices, logins to the place management facility, logins other than to one or more place management facilities, paid admission, security code, membership credential, authorization, access cards or badges, or door key pads. At least one of the actions of (a) acquiring items, (b) presenting items, and (c) managing acquisition and presentation of items is performed by resources that include hardware, software, or a combination of hardware and software, that are part of the separate locations. The hardware and software include at least one of: video equipment, audio equipment, sensors, processors, memory, storage, software, computers, handheld devices, and network. The separate locations include participants who are senders and receivers. The managing presentation of the items is performed by one or more of the network facilities not necessarily operating at any of the separate locations. The presentation of the items of content includes at least one of: changing backgrounds associated with presences of participants; presenting a common background associated with two or more of the presences of participants; changing parts of backgrounds associated with presences of participants; presenting commercial information in backgrounds associated with presences of participants; making background changes automatically based on profiles, settings, locations, and other information; and making background changes in response to manually entered instructions of the participants. The presentation of the items of content includes replacing backgrounds associated with presences of the participants with replacement backgrounds without informing participants that a replacement has been made. One or more place management facilities manage shared connections to permit focused connections among the participants who are present in the virtual places. The shared connections permit focused connections in at least one of the following modes: in events, one-to-one, group, meeting, education, broadcast, collaboration, presentation, entertainment, sports, game, and conference. The shared connections are provided for events such as business, education, entertainment, sports, games, social service, news, governance, nature and live interactions of participants. The media for the connections include at least one of: video, audio, text, chat, IM, email, asynchronous, and shared tools. The connections are carried on at least one of the following transport media: the Internet, a local area network, a wide area network, the public switched telephone network, a cellular network, or a wireless network. The shared connections are subjected to at least one of the following processes: recording, storing, editing, re-communicating, and re-broadcasting. One or more of the place management facilities permits access by non-participants to information about at least one of: virtual places, presences, participants, identities, status, activities, locations, resources, tools, applications, and communications. One or more of the place management facilities permits participants to remotely control electronic devices at remote locations of the virtual places in which they are present. One or more of the place management facilities permits participants to share one or more of the electronic devices. The sharing includes authorizing sharing by at least one of the following: manually, programmatically by authorizing automated sharing, automated sign ups with or without payments, or freely. The shared electronic devices are shared locally or remotely through a network and as permitted by a party who controls the device. The access is permitted to the information through an application programming interface. The application programming interface permits access by independent applications and services. The participants have virtual identities that each have at least one presence in at least one of the virtual places. Each of the participants has more than one virtual identity in each of the places. The multiple virtual identities of each of the participants can have presences in a virtual place at a given time. Each of the virtual identities is globally unique within one or more of the place management facilities. One or more of the place management facilities enables each of the participants to have a presence in remote parts of the virtual places. One or more of the place management facilities manages one or more groups of the participants. One or more of the place management facilities manages one or more groups of presences of participants. One or more of the place management facility manages events that are limited in time and purpose and at which participants can have presences. The participants may be observers or participants at the events. One or more of the place management facilities manages the visibility of participants to one and other at the events. The visibility includes at least one of: presence with everyone who is at the event publicly, presence only with participants who share one of the virtual places, presence only with participants who satisfy filters, including searches, set by a participant, and invisible presence. At least one of the participants includes a person. At least one of the participants includes a resource. The resource includes a tool, device, or application. The resource includes a remote location that has been substituted for a background of a virtual place. The resource includes items of content including commercial information. One or more of the place management facilities maintains records related to at least one of resources, participants, identities, presences, groups, locations, virtual places, aggregations of large numbers of presences, and events. Maintaining the records includes automatically receiving information about uses or activities of the resources, participants, identities, presences, groups, locations, participants' changes during focused connections in virtual places, and virtual places. One or more of the place management facilities recognizes the presence of participants in virtual places. One or more of the place management facilities manages a visibility to other participants of the presence of participants in the virtual places. The visibility is based on settings associated with participants, groups, virtual places, rules, and non-participants. The visibility is managed in at least two different possible levels of privacy. The visibility includes information about the participants' presence and data of the participants that is governed by privacy constraints. The privacy constraints include rules and settings selected by individual participants. The privacy constraints include that if the presence is private, the data of the participant is private, if the presence is secret then the existence of the presence and its data is invisible. The visibility is managed with respect to permitted types of communication to and from the participants. One or more of the place management facilities provides finding services to find at least one of participants, identities, presences, virtual places, connections, events, large events with many presences, locations, and resources. The finding services include at least one of: a map, a dashboard, a search, categories, lists, APIs alerts, and notifications. One or more of the place management facilities controls each participant's experience of having a presence in a virtual place, by filtering. The filtering is of at least one of: identities, participants, presences, resources, groups, and connections. The resources include tools, devices, or applications. The filtering is determined by at least one value or goal associated with the virtual place or with the participant. The value or goal includes at least one of: family or social values, spiritual values, commerce, politics, business, governance, personal, social, group, mobile, invisible or behavioral goals. Each of the virtual places spans two or more geographic locations.

In general, in an aspect, a method includes using electronic systems to acquire items of audio, video, or other media, or other data, or other content, in geographically separate acquisition places, using a publicly available set of conventions, with which any arbitrary system can comply, to enable the items of content to be carried on a publicly accessible network infrastructure, providing, on the publicly accessible network infrastructure, services that include selecting, from among the items of content, items for presentation to recipients through electronic devices at other places, the selecting being based on (a) expressed interests or goals of the recipients, to whom the items will be presented, and (b) variable boundary principles that encompass boundary preferences derived both from sources of the items of content and from the recipients to whom the items are to be presented, the variable boundary principles defining a range of regimes for passing at least some of the items to the recipients and blocking at least some of the items from the recipients, delivering the selected items of content to the recipients through the network infrastructure to the devices at the other places in compliance with the publicly available set of conventions, and presenting at least some of the selected items to the recipients at the presentation places automatically, continuously, and in real time, putting aside the latency of the network infrastructure.

Implementations may include one or more of the following features. The electronic systems include at least one of the following: cameras, video cameras, mobile phones, microphones, speakers, computers, landline telephones, VOIP phone lines, wearable computing devices, cameras built into mobile devices, PCs, laptops, stationary internet appliances, netbooks, tablets, e-pads, mobile internet appliances, online game systems, internet-enabled televisions, television set-top boxes, DVR's (digital video recorders), digital cameras, surveillance cameras, sensors, biometric sensors, personal monitors, presence detectors, web applications, websites, web services, and interactive web content. The electronic systems include software to perform functions associated with the acquisition of the items. The publicly available set of conventions also enable the items of content to be processed on the publicly accessible network infrastructure. The services provided on the publicly accessible network infrastructure are provided by software. At least one of the actions of (a) using electronic systems to acquire items in acquisition places, (b) using a publicly available set of conventions, (c) providing services, (d) delivering selected items, and (e) presenting some of the selected items, is performed by resources that include hardware, software, or a combination of hardware and software, that are part of the network infrastructure, part of the electronic devices, or part of presentation devices at the presentation places, or a combination of them. At least some of the acquisition places are also presentation places. The resources include controller resources that remotely control other, controlled resources. The controlled resources include at least one of computers, television set-top boxes, digital video recorders (DVRs), and mobile phones. The usage of at least some of the resources is shared. The shared usage may include remote usage, local usage, or networked usage. The items are acquired people using resources. At least one of the actions is performed by at least one of the resources in the context of a revenue generating business model. The revenue is generated in connection with at least one of (a) using electronic systems to acquire items in acquisition places, (b) using a publicly available set of conventions, (c) providing services, (d) delivering selected items, (e) presenting some of the selected items, (f) or advertising in connection with any of them. The revenue is generated using hardware, software, or a combination of hardware and software, that are part of the network infrastructure, part of the electronic devices, or part of presentation devices at the presentation places, or a combination of them.

In general, in an aspect, electronic devices are used at geographically separate locations to acquire and present items of content. A place management facility manages the acquisition and presentation of the items of content in a manner to maintain virtual places. Each of the virtual places is persistent and at least partially local and at least partially remote. In each of the virtual places, two or more participants can be present at any time, continuously, and simultaneously. The place management facility enables the participant to be present in the remote part of a virtual place from any arbitrary real place at which the participant is present. The place management facility controls access by the participants to each of the virtual places. The access is controlled electronically, physically, or both, to exclude intruders.

Implementations may include one or more of the following features. The access is controlled using at least one of: white lists, black lists, scripts, biometric identification, hardware devices, logins to the place management facility, logins other than to the place management facility, access cards or badges, or door key pads. At least one of the actions of (a) acquiring items, (b) presenting items, and (c) managing acquisition and presentation of items is performed by resources that include hardware, software, or a combination of hardware and software, that are part of the separate locations. The place management facility manages shared connections to permit communications among the participants who are present in the virtual places. The shared connections permit communications in at least one of the following modes: one-to-one, group, meeting, classroom, broadcast, and conference. The communications on shared connections are optionally subjected to at least one of the following processes: recording, storing, editing, re-communicating, and re-broadcasting. The place management facility permits access by non-participants to information about at least one of: virtual places, presences, participants, identities, resources, tools, applications, and communications. The place management facility permits participants to remotely control electronic devices at remote locations of the virtual places in which they are present. The place management facility permits participants to share one or more of the electronic devices. The sharing includes authorizing sharing by at least one of the following: (1) manually, (2) programmatically by authorizing automated sharing, (3) automated sign ups with or without payments, or (4) freely The shared electronic devices are shared locally or remotely through a network and as permitted by a party who controls the device. The access is permitted to the information through an application programming interface. The system enables the participants to have virtual identities that each have at least one presence in at least one of the virtual places. The place management facility enables each of the participants to have more than one virtual identity in each of the places. The multiple virtual identities of each of the participants can have presences in the virtual place at a given time. Each of the virtual identities is globally unique within the place management facility. The place management facility enables each of the participants to have a presence in remote parts of the virtual places. The place management facility manages one or more groups of the participants. The place management facility manages one or more groups of presences of participants. At least one of the participants includes a person. At least one of the participants includes a resource. The resource includes a tool, device, or application. The place management facility maintains records related to at least one of resources, participants, identities, presences, groups, locations, and virtual places. Maintaining the records includes automatically receiving information about uses or activities of the resources, participants, identities, presences, groups, locations, and virtual places. The place management facility recognizes the presence of participants in virtual places. The place management facility manages a visibility to other participants of the presence of participants in the virtual places. The visibility is managed in at least two different possible levels of privacy. The visibility includes information about the participants' presence and data of the participants that is governed by privacy constraints. The privacy constraints include that (1) if the presence is private, the data of the participant is private, (2) if the presence is secret then the existence of the presence and its data is invisible. The visibility is managed with respect to permitted types of communication to and from the participants. The place management facility provides finding services to find at least one of participants, identities, presences, virtual places, connections, locations, and resources. The place management facility controls each participant's experience of having a presence in a virtual place, by filtering. The filtering is of at least one of: identities, participants, presences, resources, groups, and communications. The resources include tools, devices, or applications. The filtering is determined by at least one value or goal associated with the virtual place or with the participant. The value or goal includes at least one of: family or social values, spiritual values, or behavioral goals. Each of the virtual places spans multiple geographic locations.

In general, in an aspect, an active knowledge management facility is operated with respect to participants who have at least one expressed goal related to at least one common activity. The active knowledge management facility accumulates information about performance of the common activity by the participants and information about success of the participants in achieving the goal, from electronic devices at geographically separate locations. The information is accumulated through a network in accordance with a set of predefined conventions for how to express the performance and success information. The active knowledge management facility adjusts guidance information that guides participants on how to reach the goal, based on the accumulated information.

Implementations may include one or more of the following features. The active knowledge management facility disseminates the adjusted participant guidance information. The electronic systems include digital cameras. The activities include actions of the users on the electronic systems, and the information about success is generated by the electronic systems as a result of the actions. The adjusted participant guidance information is disseminated by the same electronic devices from which the performance information is accumulated. The adjusted participant guidance information is disseminated by devices other than the electronic devices from which the performance information is accumulated. The active knowledge management facility includes distributed processing of the information at the electronic devices. The active knowledge management facility includes central processing of the information on behalf of the electronic devices. The active knowledge management facility includes hybrid processing of the information at the electronic devices and centrally. The participants include providers of goods or services to help other participants reach the goal. At least one of the expressed goals is shared by more than one of the participants. At least part of the information is accumulated automatically. At least part of the information is accumulated manually. The information about success of the participants in achieving the goal includes a quality of performance or a level of satisfaction. The adjusted participant guidance information includes the best guidance information for reaching the goal. At least some of the adjusted participant guidance information is disseminated in exchange for consideration. The activity information is made available to providers of guidance information. The activity information is made available to the participants. The success information is made available to providers of guidance information. The success information is made available to the participants. The activity information is made available to providers of goal reaching devices or services. The success information is made available to providers of goal reaching devices or services. The guidance information guides participants in the use of electronic devices. The activity information and the success information are accumulated at virtual places in which the participants have presences. The guidance information is used to alter a reality of the participants.

In general, in an aspect, by means of an electronically accessible persistent utility on a network, at all times and at geographically separate locations, information is accepted from and delivered to any arbitrary electronic devices or arbitrary processes. The information, which is communicated on the network, is expressed in accordance with conventions that are predefined to facilitate altering a reality that is perceived by participants who are using the electronic devices or the processes at the locations.

Implementations may include one or more of the following features. The altering of the reality is associated with becoming more successful in activities for which the participants share a goal. The altering of the reality includes providing virtual places that are in part local and in part remote to each of the separate locations and in which the participants can be present. The altering of the reality includes providing multiple altered realities for each of the participants. The arbitrary electronic devices or arbitrary processes include at least one of: televisions, telephones, computers, portable devices, players, and displays. The electronic devices and processes expose user-interface and real-world capture and presentation functions to the participants. The electronic devices and processes incorporate proprietary technology or are distributed using proprietary business arrangements, or both. At least some of the electronic devices and processes provide local functions for the participants. The local functions include local capture and presentation functions. At least some of the electronic devices and processes provide remote capture functions for participants. At least some of the electronic devices and processes include gateways between other devices and processes and the network. The utility provides services with respect to the information. The services include analyzing the information. The services include storing the information. The services include enabling access by third parties to at least some of the information. The services include recognition of an identity of a participant associated with the information. The network includes the Internet. The conventions include message syntaxes for expressing elements of the information.

In general, in an aspect, with respect to aspects of a person's reality that include interactions between the person and electronic devices that are served by a network, the person is enabled to define characteristics of an altered reality for the person or for one or more identities associated with the person. The interactions between the person or a given one of the identities of the person and each of the electronic devices are automatically regulated in accordance with the defined characteristics of the altered reality.

Implementations may include one or more of the following fetaures. The person is enabled to define characteristics of multiple different altered realities for the person or for one or more identities associated with the person. The person is enabled to switch between altered realities. The characteristics defined for an altered reality by the person are applied to automatically regulate interactions between a second person and electronic devices. Automatically regulating the interactions includes filtering the interactions. The filtering includes filtering in, filtering out, or both. Automatically regulating the interactions includes arranging for payments to the person based on aspects of the interactions with the person or one or more of the identities. A facility enables the person to define variable boundary principles of the altered reality. The interactions include presentation of items of content to the person or to one or more identities of the person. The items of content include tools and resources. The interactions include the electronic devices receiving information from the person with respect to the person or a given one or more of the identities. The electronic devices include devices that are located remotely from the person. A performance of the altered reality is evaluated based on a defined metric. The characteristics of the altered reality are changed to improve the performance of the altered reality under the defined metric. The characteristics are changed automatically. The characteristics are changed manually. The characteristics are changed by the person with respect to the person or one or more of the identities of the person. The characteristics are changed by vendors. The characteristics are changed by governances. Automatically regulating the interactions includes providing security for the person or one or more of the identities with respect to the interactions. Regulating the interactions between the person or one or more of the identities and each of the electronic devices includes reducing or excluding the interactions. Automatically regulating interactions includes increasing the amount of the interactions between the person or one or more of the identities and the electronic devices as a proportion of all of the interactions that the person or the identity has in experiencing reality. The characteristics defined for the person or the identity include goals or interests of the person or the one or more identity. The altered reality includes a shared virtual place in which the person or the one or more of the identities has a presence. The person has multiple identities for each of which the person is enabled to define characteristics of multiple different altered realities. The person is enabled to switch between the multiple different altered realities. The electronic devices include at least one of a display device, a portable communication device, and a computer. The electronic devices include connected TVs, pads, cell phones, tablets, software, applications, TV set-top boxes, digital video recorders, telephones, mobile phones, cameras, video cameras, mobile phones, microphones, portable devices, players, displays, stand-alone electronic devices or electronic devices that are served by a network. The electronic devices are local to the person or one or more of the identities. The electronic devices are mobile. The electronic devices are remote from the person or one or more of the identities. The electronic devices are virtual. The defined characteristics of the altered reality are saved and shared with other people. The results of one or more altered realities are reported for use by another person or one or more identities who utilizes the altered realities. The results of one or more altered realities are reported and shared with other people. The characteristics of reported altered realities are retrieved by other people. The person alters the defined characteristics of the altered reality for the person or one or more of the identities over time. The characteristics are defined by the person to include specified kinds of interactions by the person or one or more of the identities with the electronic devices. The characteristics are defined by the person to exclude specified kinds of interactions by the person or one or more of the identities with the electronic devices. The characteristics are defined by the person to associate payment to the person for including specified kinds of interactions by the person or one or more of the identities in the altered reality.

In general, in an aspect, through an electronically accessible persistent utility on a network, at all times and in geographically separate locations, accepting from and delivering to mobile electronic devices or processes and remote electronic devices and processes, and communicating on the network, information expressed in accordance with conventions that are predefined to facilitate altering a reality that is perceived by participants who are using the mobile electronic devices or processes and the remote electronic devices or processes at the locations.

Implementations may include one or more of the following features. The mobile electronic devices and processes comprise at least one of mobile phones, mobile tablets, mobile pads, wearable devices, portable projectors, or a combination of them. The remote electronic devices and processes comprise non-mobile devices and processes. The mobile electronic devices and processes or the remote electronic devices and processes comprise ground-based devices and processes. The mobile electronic devices and processes or the remote electronic devices and processes comprise air-borne devices and processes. The conventions that are predefined to facilitate altering a reality that is perceived by participants comprise features that enable participants to perceive, using the devices and processes, a continuously available alternate reality associated simultaneously with more than one of the geographically separate locations.

In general, in an aspect, an apparatus comprises an electronic device arranged to communicate, through a communication network, audio and video presence content in a way (a) to maintain a continuous real-time shared presence of a local user with one or more remote users at remote locations and (b) to provide to and receive from the communication network alternate reality content that represents one or more features of a sharable alternative reality for the local user and the remote users.

Implementations may include one or more of the following features. The electronic device comprises a mobile device. The electronic device comprises a device that is remote from the local user. The electronic device is controlled remotely. The presence content comprises content that is broadcast in real time. The electronic device is arranged to provide multiple functions that effect aspects of the alternative reality. The electronic device is arranged to provide multiple sources of content that effect aspects of the alternative reality. The electronic device is arranged to acquire multiple sources of remote content that effect aspects of the alternative reality. The electronic device is arranged to use other devices to share its processing load. The electronic device is arranged to respond to control of multiple types of user input. The user input may be from a different location than a location of the device.

In general, in an aspect, a user at a single electronic device can simultaneously control features and functions of a possibly changing set of other electronic devices that acquire and present content and expose features and functions that are associated with an alternative reality is experienced by the user.

Implementations may include one or more of the following features. The single electronic device can dynamically discover the features and functions of the possibly changing set of other electronic devices. A selectable set of features and functions of the possibly changing set of other electronic devices can be displayed for the user. A replica of a control interface of at least one of the possibly changing set of other electronic devices can be displayed for the user. A replica of a subset of the control interface of at least one of the possibly changing set of other electronic devices can be displayed for the user. In conjunction with a control interface associated with at least one of the possibly changing set of other electronic devices, advertising can be displayed for the user that has been chosen based on the user's control activities or based on advertising associated with a device that the user is controlling or a combination of them. In conjunction with a control interface associated with at least one of the possibly changing set of other electronic devices, content can be displayed for the user that the user chooses based on the user's control activities.

In general, in an aspect, a single electronic device is configured to simultaneously control features and functions of a possibly changing set of other electronic devices that acquire and present content and expose features and functions that are associated with an alternative reality is experienced by a user. The single electronic device includes user interface components that expose the features and functions of the possibly changing set of other electronic devices to the user and receive control information from the user.

In general, in an aspect, separate coherent alternative digital realities can be created and delivered to users, by obtaining content portions using electronic devices locally to the user and at locations accessible on a communication network. Each of the content portions is usable as part of more than one of the coherent alternative digital realities. Content portions are selected to be part of each of the coherent alternative digital realities based on a nature of the coherent alternative reality. The selected content portions are associated as parts of the coherent alternative digital reality. Each of the coherent digital realities is made selectively accessible to users on the communication network to enable them to experience each of the coherent digital realities.

Implementations may include one or more of the following features. The associating comprises at least one of combining, adding, deleting, and transforming. Each of the digital realities is made accessible in real time. The content portions are made accessible to users for reuse in creating and delivering coherent digital realities. At least some of the selected content portions that are part of each of the coherent digital realities are accessible in real time to the users.

In general, in an aspect, a user of an electronic device can selectively access any one or more of a set of separate coherent digital realities that have been assembled from content portions obtained locally to the user and/or at remote locations accessible on a communication network. At least some of the content portions are reused in more than one of the separate coherent digital realities. At least some content portions for at least some of the coherent digital realities are presented to the user in real-time.

In general, in an aspect, in response to information about selections by users, making available to the users for presentation on electronic devices local to the users, one or more of a set of separate coherent alternative digital realities that have been assembled from content portions obtained locally to the users and/or at remote locations accessible on a communication network. At least some of the content portions are reused in more than one of the separate coherent alternative digital realities. At least some of the content portions for at least some of the coherent digital realities are presented to the users in real time.

Implementations may include one or more of the following features. At least some of the content portions and the separate coherent digital realities are distributed through the communication network so that they can be made available to the users. Different ones of the coherent digital realities share common content portions and have different content portions based on information about the users to whom the different ones of the coherent digital realities will be made available.

Implementations may include one or more of the following features. A user who has a digital presence in one of the alternative digital realities is enabled to select an attribute of other people who will have a presence with the user in the alternative digital reality. And only people having the attribute, and not others, will have a presence in the presentation of that alternative digital reality to the user. A user who has a digital presence in one of the alternative digital realities can select an attribute of other people who will have a presence with the user in the alternative digital reality and to retrieve information related to said attribute, and display the information associated with each of the other people.

In general, in an aspect, a market is maintained for a set of coherent digital realities that are assembled from content portions that are acquired by electronic devices at geographically separate locations, including some locations other than the locations of users or creators of the coherent digital realities. The content portions include real-time content portions and recorded content portions. The market is arranged to receive coherent digital realities assembled by creators and to deliver coherent digital realities selected by users. The market includes mechanisms for compensating creators and charging users.

Implementations may include one or more of the following features. A user who selects a coherent digital reality can share the user's presence in that selected coherent digital reality with other users who also select that coherent reality and have agreed to share their presence in the selected coherent reality, while excluding any who choose that coherent reality but have not agreed to share their presence.

Implementations may include one or more of the following features. Information about popularities of the coherent digital realities is collected and made available to users. Information about users who share a coherent digital reality is collected and used to enable users to select and have a presence in the coherent digital reality based on the information. A user is charged for having a presence in a coherent digital reality. Selection of and presence in a coherent digital reality are regulated by at least one of the following regulating techniques: membership, subscription, employment, promotion, bonus, or award. The market can provide coherent digital realities from at least one of an individual, a corporation, a non-profit organization, a government, a public landmark, a park, a museum, a retail store, an entertainment event, a nightclub, a bar, a natural place or a famous destination.

In general, in an aspect, through a local electronic device, a potentially varying remote reality is presented to a user at a local place. The remote reality includes sounds or views or both that have been derived at a remote place. The remote reality is representative of varying actual experiences that a person at the remote place would have as the remote context in which that person is having the actual experiences changes. Changes in a local context in which the user at the local place is experiencing the remote reality are sensed. The presentation of the remote reality to the user at the local place is very based on the sensed changes in the local context in which the user at the local place is experiencing the remote reality. The presentation of the remote reality to the user at the local place is varied based also on the actual experience of the person at the remote place for a remote context that corresponds to the local context.

Implementations may include one or more of the following features. The local context comprises an orientation of the user relative to the local electronic device. The presentation of the remote reality is also varied based on information provided by the user at the local place. The local context comprises a direction of the face of the user. The local context comprises motion of the user. The presentation is varied continuously. The sensed changes are based on face recognition. The presentation is varied with respect to a field of view. The sensed changes comprise audio changes. The presentation is varied with respect to at least one of the luminance, hue, or contrast.

In general, in an aspect, an awareness of a potentially changing direction in which a person in the locale of an electronic device is facing is automatically maintained, and a direction of real-time image or video content is presented by the electronic device to the person is automatically and continuously changed to correspond to the changing direction of the person in the locale.

In general, in an aspect, through one or more audio visual electronic devices, at a local place associated with a user, an alternative reality is presented to the user. The alternative reality is different from an actual reality of the user at the local place. A state of susceptibility of the user to presentation of the alternative reality at the local place is automatically sensed, and the state of presentation of the alternative reality for the user is automatically controlled, based on the sensed state of susceptibility.

Implementations may include one or more of the following features. The state of susceptibility comprises a presence of the user in the locale of at least one of the audio visual devices. The state of susceptibility comprises an orientation of the user with respect to at least one of the audio visual devices. The state of susceptibility comprises information provided by the user through a user interface of at least one of the audiovisual devices. The state of susceptibility comprises an identification of the user. The state of susceptibility corresponds to a selected one of a set of different identities of the user.

In general, in an aspect, as a person approaches an electronic device on which a digital reality associated with the person can be presented to the person, the person is automatically identified. The digital reality includes live video from another location and other content portions to be presented simultaneously to the person. The electronic device is powered up in response to identifying the person. The presentation of the digital reality to the person is begun automatically. A determination of when the identified person is no longer in the vicinity of the electronic device is automatically made. The device is automatically powered down in response to the determination.

In general, in an aspect, a content broadcast facility is provided through a communication network. The broadcast facility enables users to find and access, at any location at which the network is accessible, broadcasts of real-time content that represent at least portions of alternative realities that are alternative to actual realities of the users. The content has been obtained at separate locations accessible through the network, from electronic devices at the separate locations.

Implementations may include one or more of the following features. A directory service enables at least one of the users to identify real-time content that represents at least portions of selected alternative realities of the users. Metadata of the real-time content is generated automatically. Users can find and access broadcasts of non-real-time content. Broadcasts of real-time content are provided automatically that represent at least portions of alternative realities that are alternative to actual realities of the users, according to a predefined schedule.

In general, in an aspect, live video discussion are enabled between two persons at separate locations through a communication system. At least one of the person's participation in the live video discussion includes features of an alternative reality that is alternative to an actual reality of the person. Language differences between the two people are automatically determined based on their live speech during the video discussion. The speech of one or the other or both of the two people is automatically translated in real time during the video discussion.

Implementations may include one or more of the following features. The language differences are determined based on pre-stored information. The language differences are determined based on locations of the persons with respect to the alternative reality. More than two persons are participating in the live video discussion, language differences among the persons are determined automatically, and the speech of the persons is translated in real-time automatically as different people speak. Non-speech material is translated as part of the alternative reality. Live speech is recorded during the video discussion as text in a language other than the language spoken by the speaker.

In general, in an aspect, at an electronic device that is in a local place, speech of a user is recognized, and the recognized speech is used to enable the user to participate, through a communication network that is accessible at the local place and at remote places, in one or more of the following: (a) an alternate reality of the user, (b) any of multiple identities of the user, or (c) presence of the user in a virtual place.

Implementations may include one or more of the following features. The recognized speech is used to automatically control features of the presentation of the alternate reality to the user. The recognized speech is used to determine which of the multiple identities of the user is active, and the user automatically can participate in a manner that is consistent with the determined identity. The recognized speech is used to determine that the user is present in the virtual place, and the virtual place as perceived by other users is caused to include the presence of the user.

In general, in an aspect, through an electronic device that is at a local place and has a user interface, a user is enabled to simultaneously control services available on one or more other devices at least some of which are at remote places that are electronically accessible from the local electronic device, in order to (a) participate in an alternative reality, (b) exercise an alternative presence, or (c) exercise an alternative identity.

Implementations may include one or more of the following features. The local electronic device and at least some of the multiple other devices are respectively configured to use incompatible protocols for their operation or communication or both. At least some of the services are available on the multiple other devices provide or use audio visual content. At least some of the multiple other devices are not owned by the user. At least some of the multiple other devices comprise different proprietary operating systems. Translation services are provided with respect to the incompatible protocols. At least some of the multiple other devices include control applications that respond to the control of the user at the local place. At least some of the multiple other devices include viewer applications that provide a view to the user at the local place of the status of at least one of the other devices. The user has multiple alternate identities and the user is enabled to control the services available on the multiple other devices in modes that relate respectively to the multiple alternate identities. The services comprise services available from one or more of applications. The services comprise acquisition or presentation of digital content. The services are paid for by the user. The services are not paid for by the user. The user can locate the services using the electronic device at the local place. Audio visual content is provided to or were used from the other devices. At least some of the other devices are not owned by a user of the electronic device at the local place. At least some of the other devices include control applications that respond to the electronic device at the local place. At least some of the other devices include viewer applications that provide views to a user at the local place of the status of at least one of the other devices. The services are available from one or more applications running on the other devices. The services available from the other devices comprise acquisition or presentation of digital content. The services available from the other devices are paid for by a user. The services available from the other devices are not paid for by a user. A user can locate services available from the other devices using the electronic device at the local place.

In general, in an aspect, multiple users at different places, each working through a user interface of an electronic device at a local place, can locate and simultaneously control different services available on multiple other devices at least some of which are at remote places that are electronically accessible from the local electronic device.

Implementations may include one or more of the following features. At least some of the local electronic devices and the multiple other devices are respectively configured to operate using incompatible protocols for their operation or communication or both. The registration of at least some of the other devices is enabled on a server that tracks the devices, the services available on them, their locations, and the protocols used for their operation or communication or both. The services comprise one or more of the acquisition or delivery of digital content, features of applications, or physical devices.

In general, in an aspect, from a first place, remotely controlling simultaneously, through a communication network, different types of subsidiary electronic devices located at separate other places where the communication network can be accessed. The simultaneous remote controlling comprises providing commands to and receiving information from each of the different types of subsidiary devices in accordance with protocols associated with the respective types of devices, and providing conversion of the commands and information as needed to enable the simultaneous remote control.

Implementations may include one or more of the following features. The simultaneous remote controlling is with respect to two identities of the user. Audio visual content is provided to or used from the subsidiary electronic devices. At least some of the subsidiary devices are not owned by a user who is remotely controlling. At least some of the subsidiary devices include control applications that respond to the controlling. At least some of the subsidiary devices include viewer applications that provide views to a user at the first place of the status of at least one of the subsidiary devices. The services are available from one or more applications running on the subsidiary devices. The services available from the subsidiary devices comprise acquisition or presentation of digital content. The services available from the subsidiary devices are paid for by a user. The services available from the subsidiary devices are not paid for by a user. A user can locate services available from the subsidiary devices using an electronic device at the first place.

In general, in an aspect, at a local place, portal services support an alternate reality for a user at a remote place, the portal services is arranged (a) to receive communications from the user at a remote place through a communications network, and, (b) in response to the received communications, to interact with a subsidiary electronic device at the local place to acquire or deliver content at the local place for the benefit of the user and in support of the alternate reality at the remote place. The subsidiary electronic device is one that can be used for a local function at the local place unrelated to interacting with the portal services. The owner of the subsidiary electronic device is not necessarily the user at the remote place.

In general, in an aspect, on an electronic device that provides standalone functions to a user, a process configures the electronic device to provide other functions as a virtual portal with respect to content that is associated with an alternate reality of the user or of one or more other parties. The process enables the electronic device to capture or present content of the alternate reality and to provide or receive the content to and from a networked device in accordance with a convention used by the networked device to communicate.

Implementations may include one or more of the following features. The electronic device comprises a mobile phone. The electronic device comprises a social network service. The electronic device comprises a personal computer. The electronic device comprises an electronic tablet. The electronic device comprises a networked video game console. The electronic device comprises a networked television. The electronic device comprises a networking device for a television, including a set top cable box, a networked digital video recorder, or a networking device for a television to use the Internet. The networked device can be selected by the user. A user interface associated with the networked device is presented to the user on the electronic device. The user can control the networked device by commands that are translated. The networked device also provides content to or receives content from another separate electronic device of another user at another location with respect to an alternate reality of the other user. The content presented on the electronic device is supplemented or altered based on information about the user, the electronic device, or the alternate reality.

In general, in an aspect, a user, who is one of a group of participants in an electronically managed online governance that is part of an alternative reality of the user, can compensate the governance electronically for value generated by the governance.

Implementations may include one or more of the following features. The governance comprises a commercial venture. The governance comprises a non-profit venture. The compensation comprises money. The compensation comprises virtual money, credit, or scrip. The compensation is based on a volume of activity associated with the governance. The compensation is determined as a percentage of the volume of activity. The participant may alter the compensation. The activity comprises a dollar volume of commercial transactions. Online accounts of the compensation are maintained.

In general, in an aspect, a user of an electronic device, who is located in a territory that is under repressive control of a territorial authority and whose real-world existence is repressed by the authority, can use the electronic device to be present as a non-repressed identity in an alternative reality that extends beyond the territory. The presence of the user as the non-repressed identity in the alternative reality is managed to reduce impact on the real-world existence of the user. The managing the presence of the user as the non-repressed identity comprises enabling the user to be present in the alternative reality using a stealth identity. Through the stealth identity, the user may own property and engage in electronic transactions that are associated with the stealth identity, and are associated with the user only beyond the territory that is under repressive control. Managing the presence of the user comprises providing a secure connection of the user alternative reality. Managing the presence of the user comprises enabling the user to be camouflaged or disguised with respect to the alternative reality. Managing the presence of the user comprises protecting the user's presence with respect to monitoring by the territorial authority. Managing the presence of the user comprises enabling the user to engage in electronic transactions through the alternative reality with parties who are not located within the territory.

In general, in an aspect, a user is entertained by presenting aspects of an entertainment alternative reality to the user through one or more electronic devices. The entertainment alternative reality is presented in a mode in which the user need not be a participant in or have a presence in the alternative reality or in a place where the alternate reality is hosted. The user can observe or interact with the aspects of the alternative reality as part of entertaining the user.

Implementations may include one or more of the following features. The entertaining of the user comprises presenting the aspects of the alternative reality through a commonly used entertainment medium. The entertaining of the user by presenting aspects of an entertainment alternative reality continues uninterrupted and is always available to the user. The entertainment alternative reality progresses in real-time. The entertainment alternative reality comprises an event. The aspects of the entertainment alternative reality are presented to the user through a broadcast medium. The entertaining replaces a reality that the user is not able to experience in real life. The entertainment alternative reality comprises a fictional event. The entertainment alternative reality is associated with a novel. The entertaining comprises presenting a movie. The presenting of aspects of an entertainment alternative reality comprises serializing the presenting. The two or more different users are presented aspects of an entertainment alternative reality that are custom-formed for each of the users.

Implementations may include one or more of the following features. Behavior of the user or of a population of users is changed by altering the entertaining over time. The user registers as a condition to the entertaining. The entertaining is associated with a time line or a roadmap or both. The time line or the roadmap or both are changed dynamically in connection with the entertaining. The timeline is non-linear. The entertaining uses groups of users associated with opposing sides of the entertainment alternative reality. The presenting of aspects of the entertainment alternative reality includes engaging people in real world activities as part of the entertainment alternative reality. The user plays a role with respect to the entertaining. The user adopts an entertainment identity with respect to the entertaining. The user employs her real identity with respect to the entertaining. The entertaining of the user is part of a real-world exercise for a group of users. The entertaining comprises part of a money-making venture. A group of the users comprises a money-making venture with respect to the entertaining. A group of the users incorporates as a money-making venture within the entertaining. The money-making venture with respect to the entertaining is conducted using at least one of virtual money, real money, scrip, credit, or another financial instrument. The money-making entertainment venture is associated with at least one of creating, designing, building, manufacturing, selling, or supporting commercial items or services. The entertaining is associated with a financial accounting system for the delivery and acquisition of products and services. The entertaining is associated with a financial accounting system for buying, selling, valuing, or owning at least one of virtual or goods or services. The entertaining is associated with a financial accounting system for assets of entertainment identities and real identities with respect to the entertainment. The entertaining is associated with a financial accounting system for accounts of entertainment identities and real identities that are represented by at least one of virtual money, real money, scrip, credit or another financial instrument. A system records, analyzes, or reports on the relationship of aspects of the entertaining to outcomes of the entertaining.

In general, in an aspect, a coherent digital reality is constructed based on at least one of a story, a character, a place, a setting, an event, a conflict, a timeline, a climax, or a theme of an entertainment in any medium. A user is entertained by presenting aspects of an entertainment coherent digital reality to the user through one or more electronic devices. The entertainment coherent digital reality is presented in a mode in which the user need not be a participant in or have a presence in the coherent digital reality or in a place where the coherent digital reality is hosted. The user can observe or interact with the aspects of the coherent digital reality as part of entertaining the user. The entertainment coherent digital reality comprises part of a market of coherent digital realities.

In general, in an aspect, users can participate electronically in a governance that provides value to the users in connection with one or more alternative realities, in exchange for consideration delivered by the users. Membership relationships between the users and the governance, and the flow of value to the users and consideration from the users, are managed.

Implementations may include one or more of the following features. Each of at least some of the users participate electronically in other governances. The governance is associated with a profit-making venture. The governance is associated with a non-profit venture. The governance is associated with a government. The governance comprises a quasi-governmental body that spans political boundaries of real governmental bodies. The value provided by the governance to the users comprises improved lives. The value provided by the governance to the users comprises improved communities, value systems, or lifestyles. The value provided by the governance to the users comprises a defined package that is presented to the users and has a defined consideration associated with it.

In general, in an aspect, users are electronically provided with offers to participate as members of an online governance in one or more alternative reality packages that encompass defined value for the users in terms of improved lives, communities, value systems, or lifestyles, managing participation by the users in the governance. Consideration is collected in exchange for the defined value offered by the online governance.

In general, in an aspect, information is acquired that is associated with images captured by users of image-capture equipment in associated contexts. Based on at least the acquired information, guidance is determined that is to be provided to users of the image capture equipment based on current contexts in which the users are capturing additional images. The guidance is made available for delivery electronically to the users in connection with their capturing of the additional images.

Implementations may include one or more of the following features. The current contexts comprise geographic locations. The current contexts comprise settings of the image capture equipment. The image capture equipment comprises a digital camera or digital video camera. The image capture equipment comprises a networked electronic device whose functions include at least one of a digital camera or a digital video camera. The guidance is delivered interactively with the user of the image capture equipment during the capture of the additional images. The guidance comprises part of an alternative reality in which the user is continually enabled to capture better images in a variety of contexts.

In general, in an aspect, in connection with enabling the presentation at separate locations of an alternative reality to users of electronic devices that have non-compatible operating platforms, for each of the electronic devices an interface configured to present the alternative reality to users of the electronic devices is centrally and dynamically generated. The Generated interface for each of the electronic devices is compatible with the operating platform of the device.

Implementations may include one or more of the following features. Each of the interfaces is generated from a set of pre-existing components. The pre-existing components are based on open standards. Each of the interfaces is generated from a combination of pre-existing components and custom components. The devices comprise multimedia devices. As the operating platform of each of the devices is updated, the dynamically generated interface is also updated.

In general, in an aspect, an electronic network is maintained in which information about personal, individual, specific, and detailed actions, behavior, and characteristics of users of devices that communicate through the electronic network are made available publicly to users of the devices. Users of the devices can use the publicly available information to determine, from the information about actions, behavior, and characteristics of the users, ways to enable the users of the devices to improve their performance or reduce their failures with respect to identified goals.

Implementations may include one or more of the following features. The ways to improve comprise commercial products. The actions, behavior, and characteristics of the users individually are tracked over time. The improvement of performance or reduction of failure is reported about individual users and about users in the aggregate. The ways to improve performance or reduce failure are provided through an online platform accessible to the users through the network. Users of the devices can manage their goals. The managing their goals comprises registering, defining goals, setting a baseline for performance, and receiving information about actual performance versus baseline. The ways to enable the users of the devices to improve their performance or reduce their failures are updated continually. Users are informed about the ways to improve by delivering at least one of advertising, marketing, promotion, or online selling. The ways to improve comprise enabling a user who is making an improvement as part of an alternative reality to associate in the alternative reality with at least one other user who is making a similar improvement.

In general, in an aspect, a user of an electronic device is engaged in a reality that is an alternative to the one that she experiences in the real world at the place where she is located, by automatically presenting to her an always available multimedia presentation that includes recorded and real-time audio and video captured through other electronic devices at multiple other locations and is delivered to her through a communication network. The multimedia presentation includes live video of other people at other locations who are part of the alternative reality and video of places that are associated with the alternative reality. The user is given a way to control the presentation to suit her interests with respect to the alternative reality.

In general, in an aspect, a person can have a presence in an online world that is an alternative to a real presence that the person has in the real world. The alternative presence is persistent and continuous and includes aspects represented by real-time audio or video representations of the person and other aspects that are not real-time audio or video representations and differ from features of the person's real presence in the real world. The person's alternative presence is accessible by other people at locations other than the real world location of the person, through a communication network.

In general, in an aspect, through multimedia electronic devices and a communication network, a user can exist as one or more multiple selves that are alternates to her real self in the real world locale in which she is present. The multiple selves include at least some aspects that are different from the aspects of her self in the real world locale in which she is present. The multiple selves can be present in multiple remote places in addition to the real world locale. She can select any one or more of the multiple selves to be active at any time and when her real self is present in any arbitrary real world locale at that time.

In general, in an aspect, a person can electronically participate with other people in an alternative reality, by using at least one electronic device at the place where the person is located, and other electronic devices located at other places and accessible through a communication network. The alternative reality is conveyed to the person through the electronic device in such a way as to present an experience for the person that is substantially different from the physical reality in which the person exists, and exhibits the following qualities that are similar to qualities that characterize the physical reality in which the person exists: the alternative reality is persistent; audio visual; compelling; social; continuous; does not require any action by the person to cause it to be presented; has the effect of altering behavior, actions, or perceptions of the person about the world; and enables the person to improve with respect to a goal of the person.

These and other aspects, features, and implementations, and combinations of them, can be expressed as methods, systems, compositions, devices means or steps for performing functions, program products, media that store instructions or databases or other data structures, business methods, apparatus, components, and in other ways.

These and other aspects, features, advantages, and implementations will be apparent from the prior and following discussion, and from the claims.

DESCRIPTION OF THE DRAWINGS

FIG. 130 is a flow chart showing some examples of procedures for a property protection devices for interactive properties, locations, devices, etc.

FIG. 131 is a pictorial diagram that briefly summarizes some components of an Alternate Reality Teleportal Machine (ARTPM), highlighting the Teleportal Utility(ies).

FIG. 132 is a block diagram illustrating an example of elements in some global technologies (prior art).

FIG. 133 is a block diagram illustrating an example of factored common elements in some global technologies (prior art), to identify "utility" elements.

FIG. 134 is a pictorial block diagram illustrating a summary example of common elements, services and transport in a Teleportal Utility(ies) (TPU).

FIG. 135 is a pictorial block diagram illustrating a TPU (Teleportal Utility[ies]) overview.

FIG. 136 is a pictorial block diagram illustrating some examples of TPU security and privacy.

FIG. 137 is a pictorial block diagram illustrating some examples of TPU data sharing.

FIG. 138 is a pictorial block diagram illustrating some examples of TPU messaging and metering.

FIG. 139 is a graphical diagram illustrating some examples of TPU managed transport and latency.

FIG. 140 is a pictorial block diagram illustrating some examples of TPU managed transport—differentiated services.

FIG. 141 is a pictorial block diagram illustrating some examples of TPU managed transport—differentiated session services.

Figure 142:
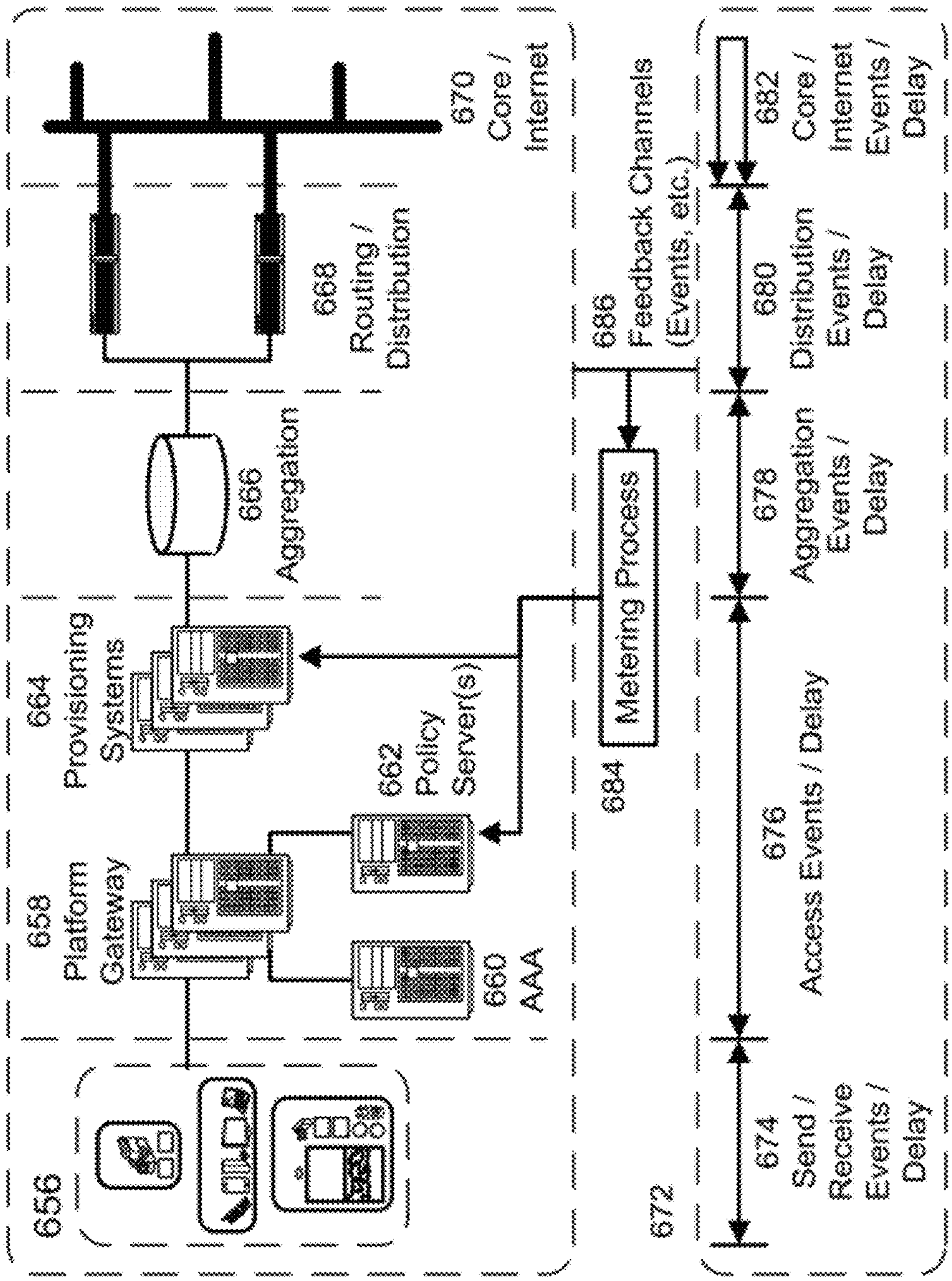

FIG. 142 is a pictorial block diagram illustrating some examples of TPU managed transport—optimizing service quality.

Figure 143:
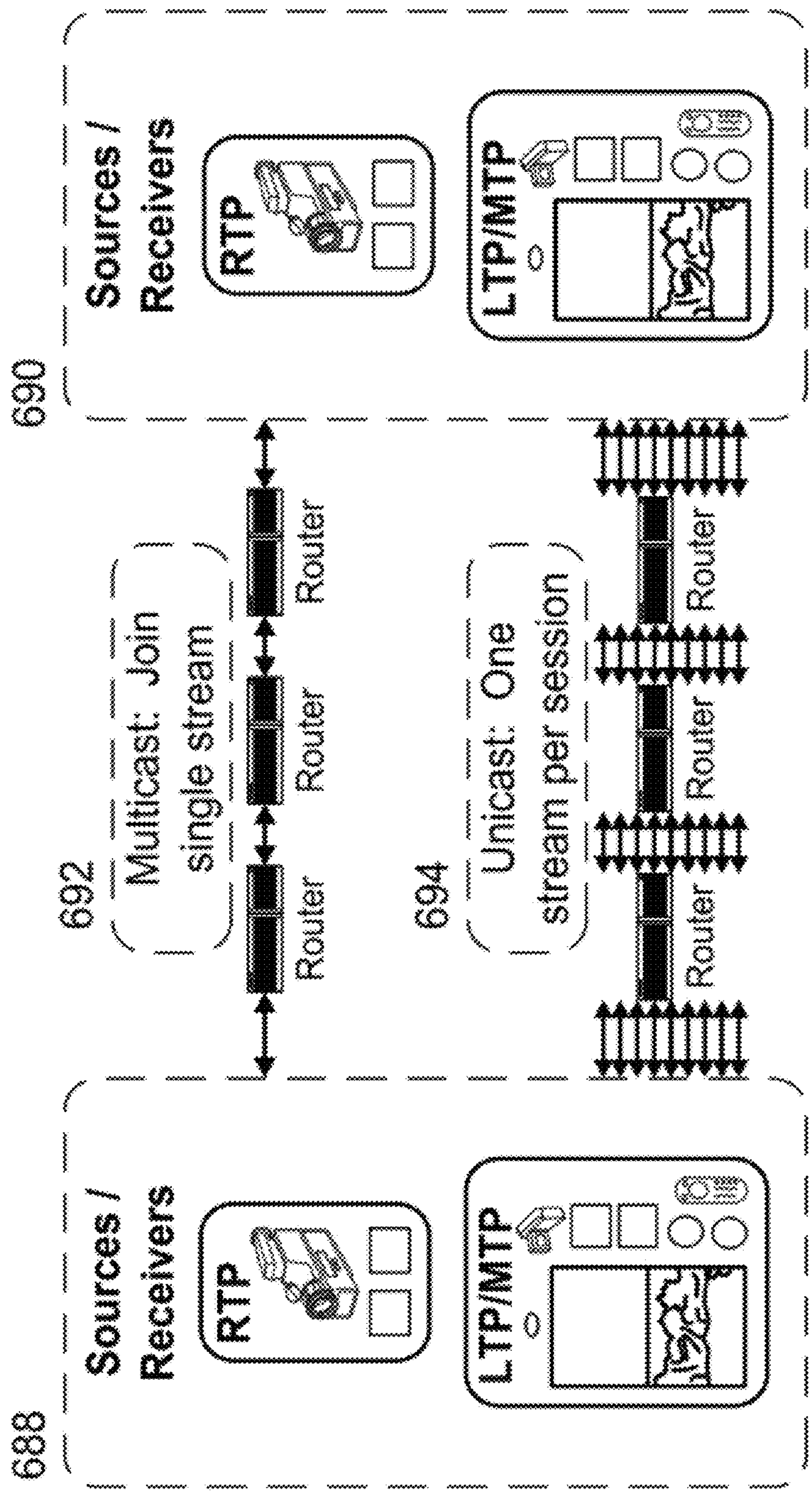

FIG. 143 is a pictorial block diagram illustrating some examples of TPU managed transport—bandwidth reduction, multicast and unicast.

Figure 144:
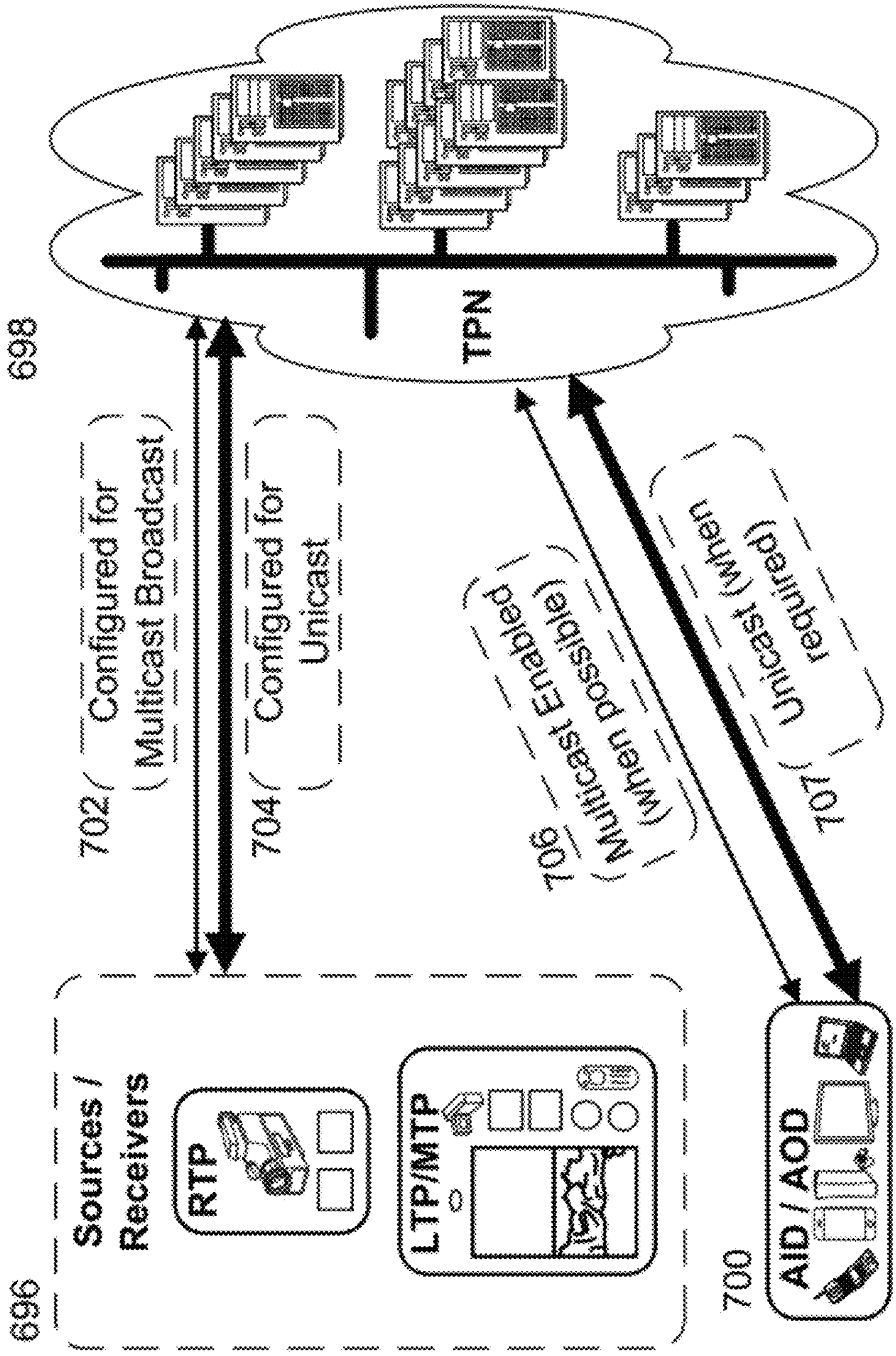

FIG. 144 is a pictorial block diagram illustrating some examples of TPU managed transport—bandwidth reduction, multicast broadcast.

Figure 145:
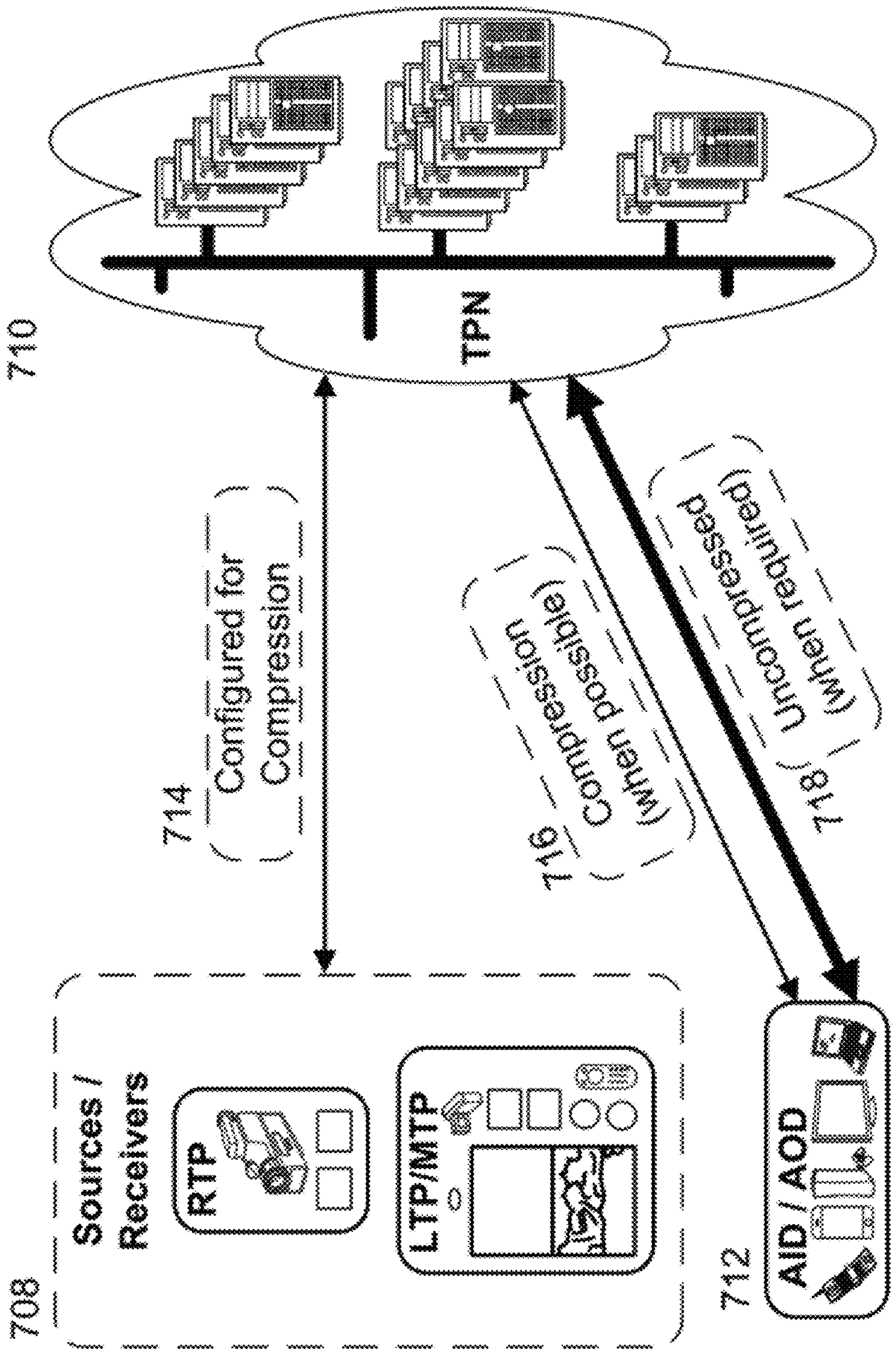

FIG. 145 is a pictorial block diagram illustrating some examples of TPU managed transport—bandwidth reduction, compression.

Figure 146:
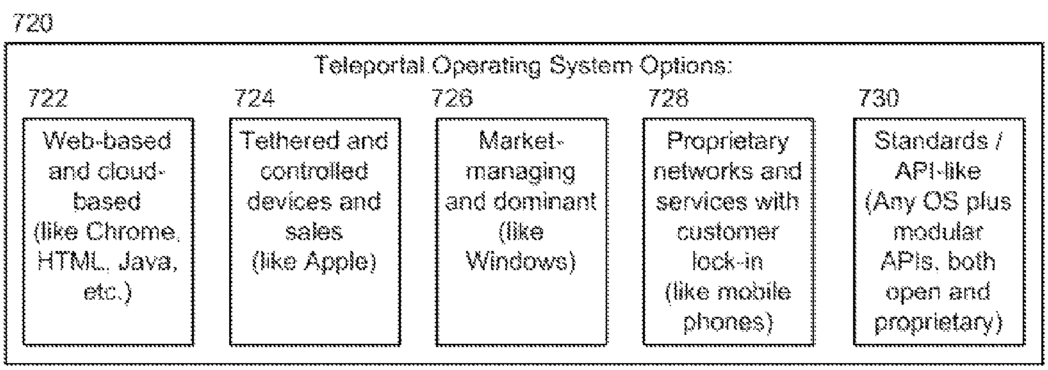

FIG. 146 is a pictorial block diagram illustrating some examples of TPU OS's.

Figure 147:
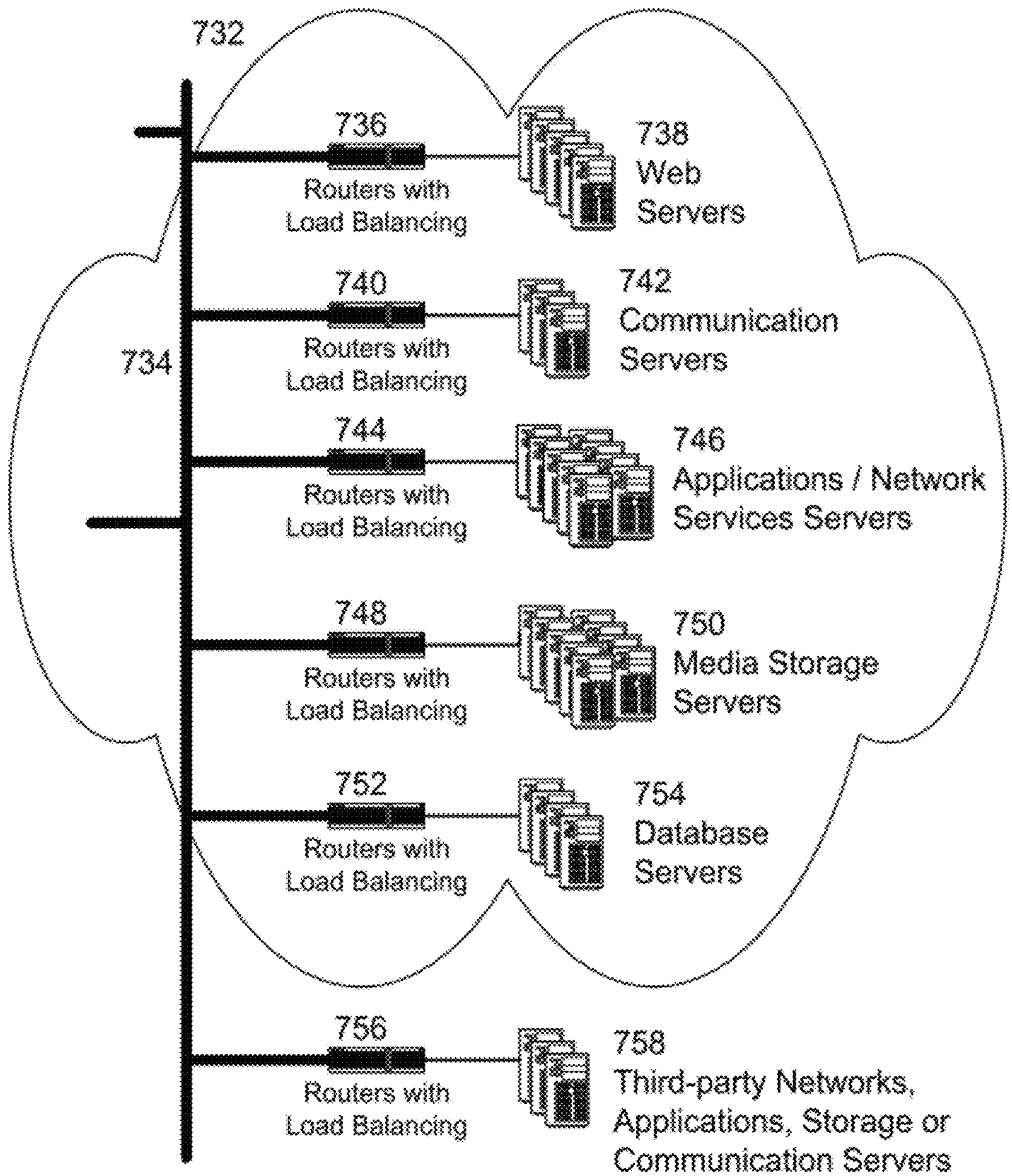

FIG. 147 is a pictorial block diagram illustrating some examples of TPU servers, storage and load balancing.

Figure 148:
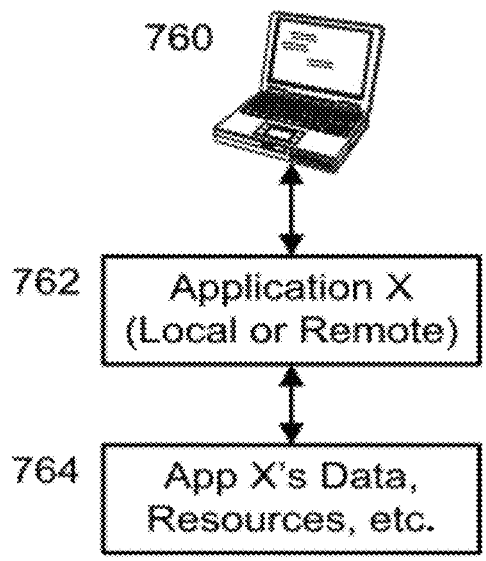

FIG. 148 is a pictorial block diagram illustrating some examples of current non-virtual applications (prior art).

Figure 149:
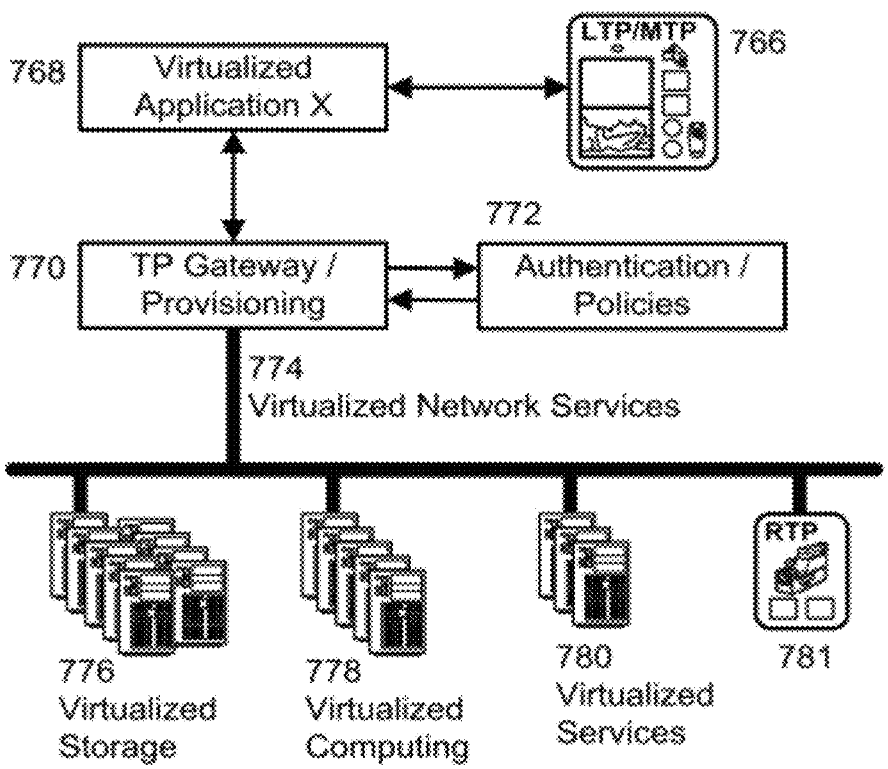

FIG. 149 is a pictorial block diagram illustrating some examples of TPU virtual applications.

Figure 150:
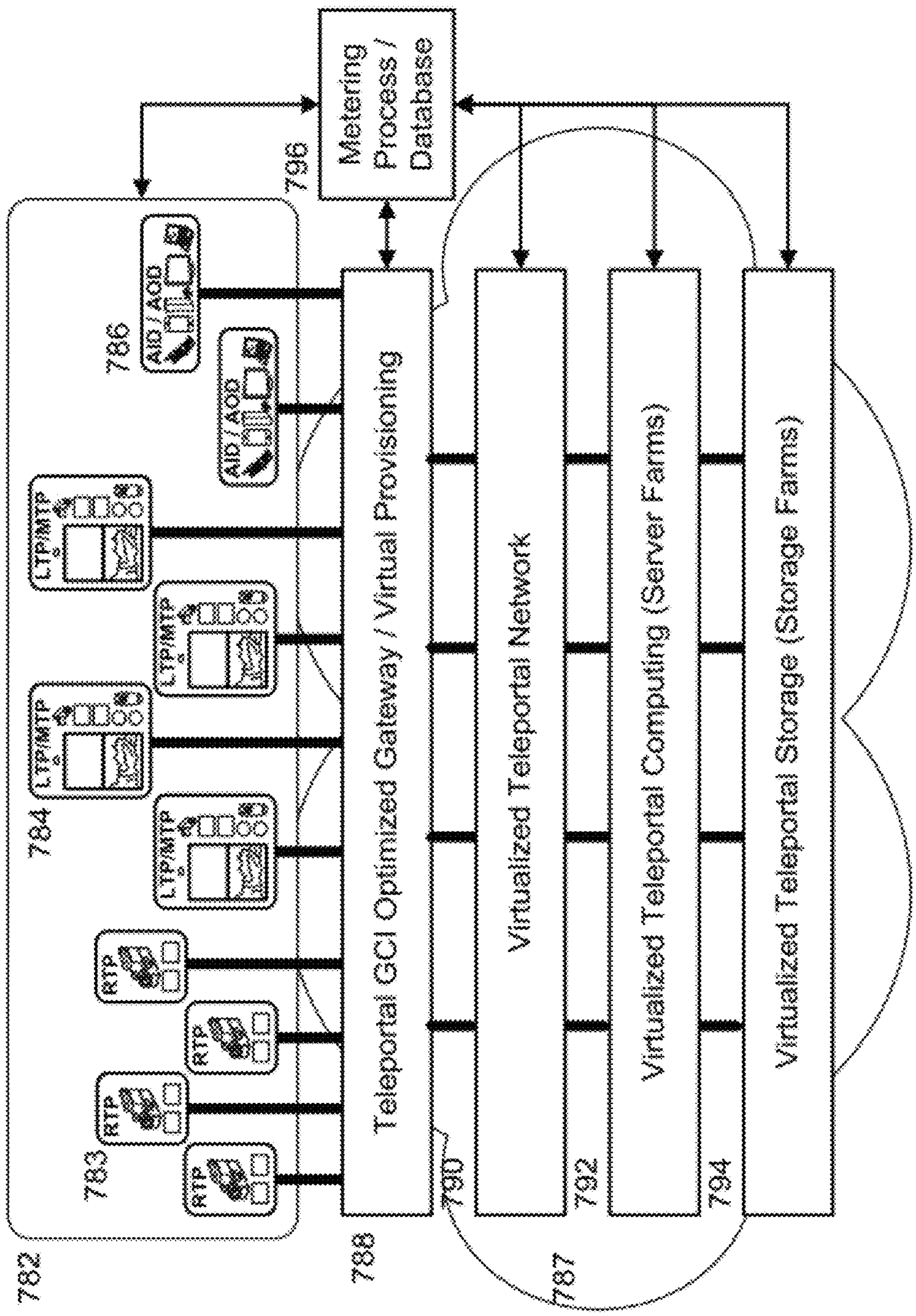

FIG. 150 is a pictorial block diagram illustrating some examples of TPU virtual architecture.

Figure 151:
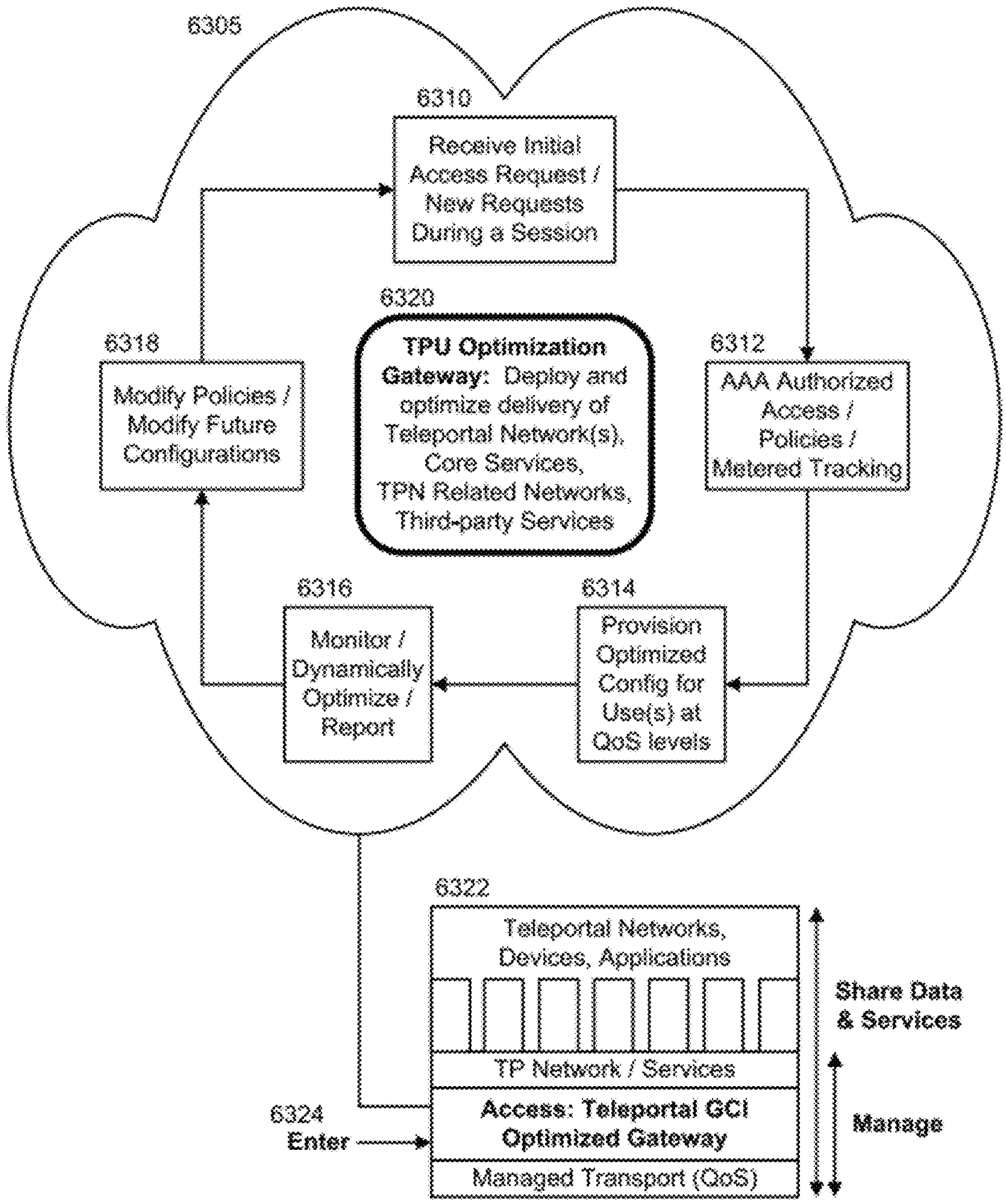

FIG. 151 is a pictorial block diagram illustrating some examples of a TPU optimization gateway (TPOG, or Teleportal Optimized Gateway).

Figure 152:
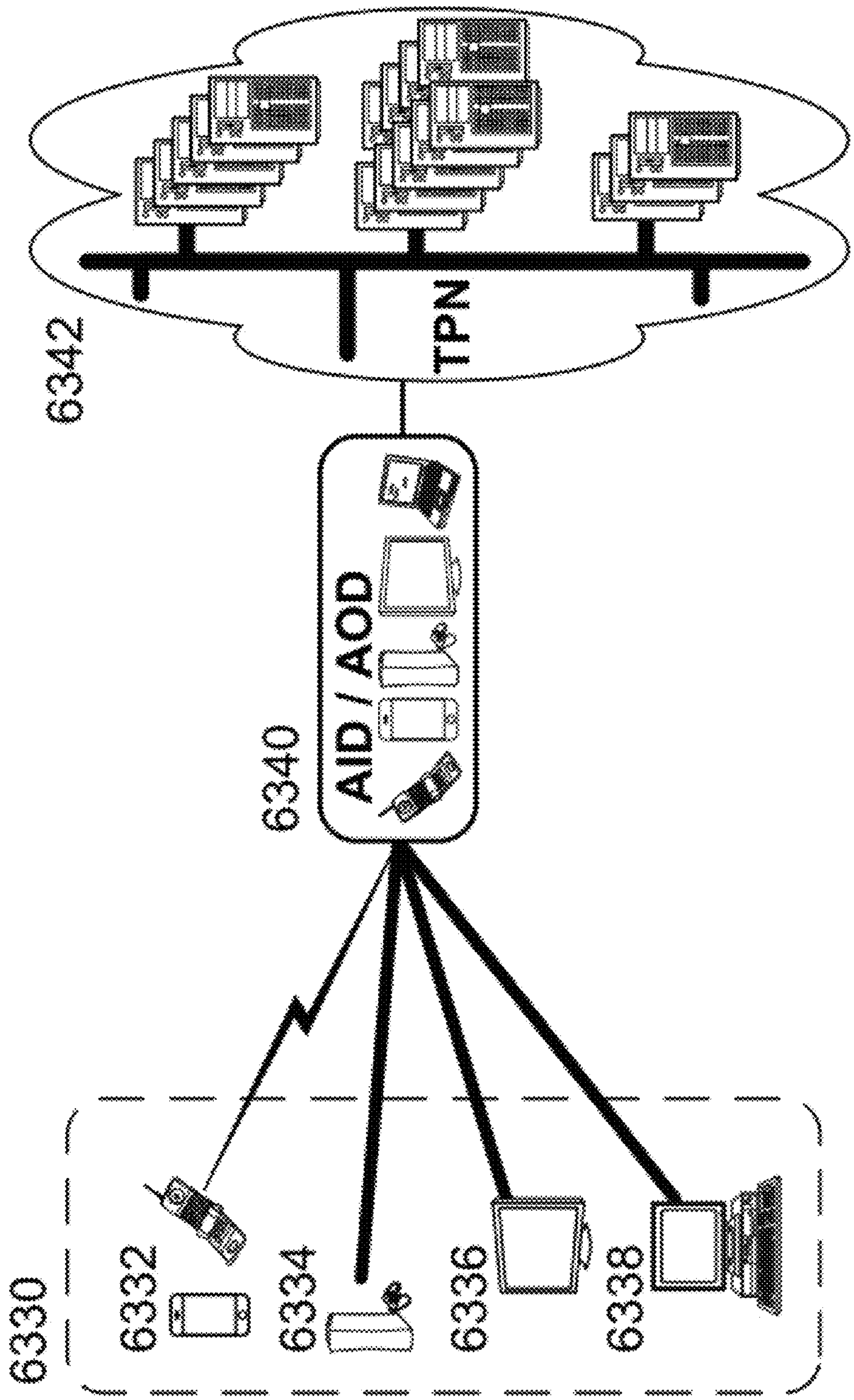

FIG. 152 is a pictorial block diagram illustrating some examples of TPU AID/AOD (Alternative Input Device/Alternative Output Device) sessions.

Figure 153:
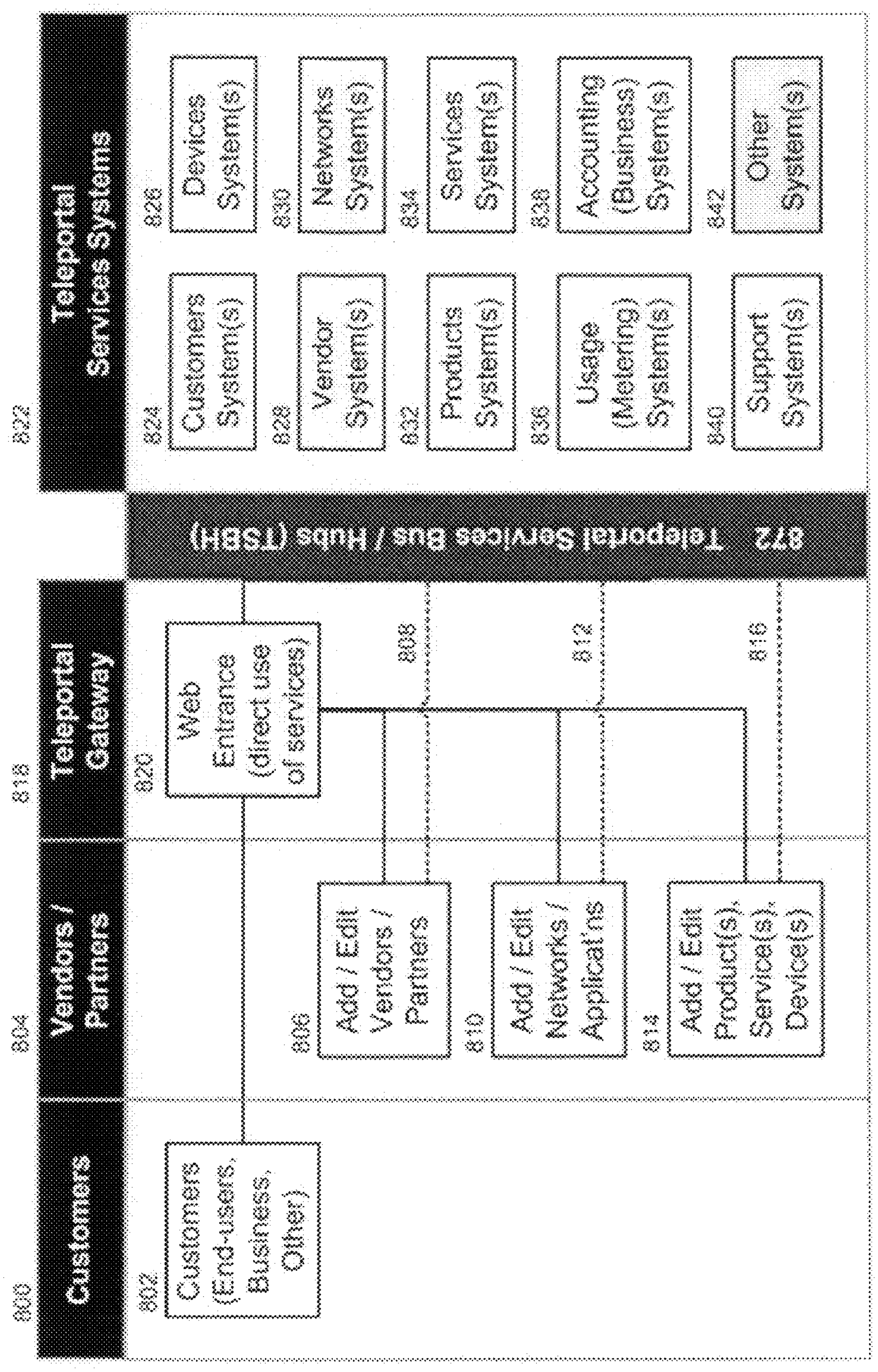

FIG. 153 is a block diagram illustrating some examples of TPU events services processes.

Figure 154:
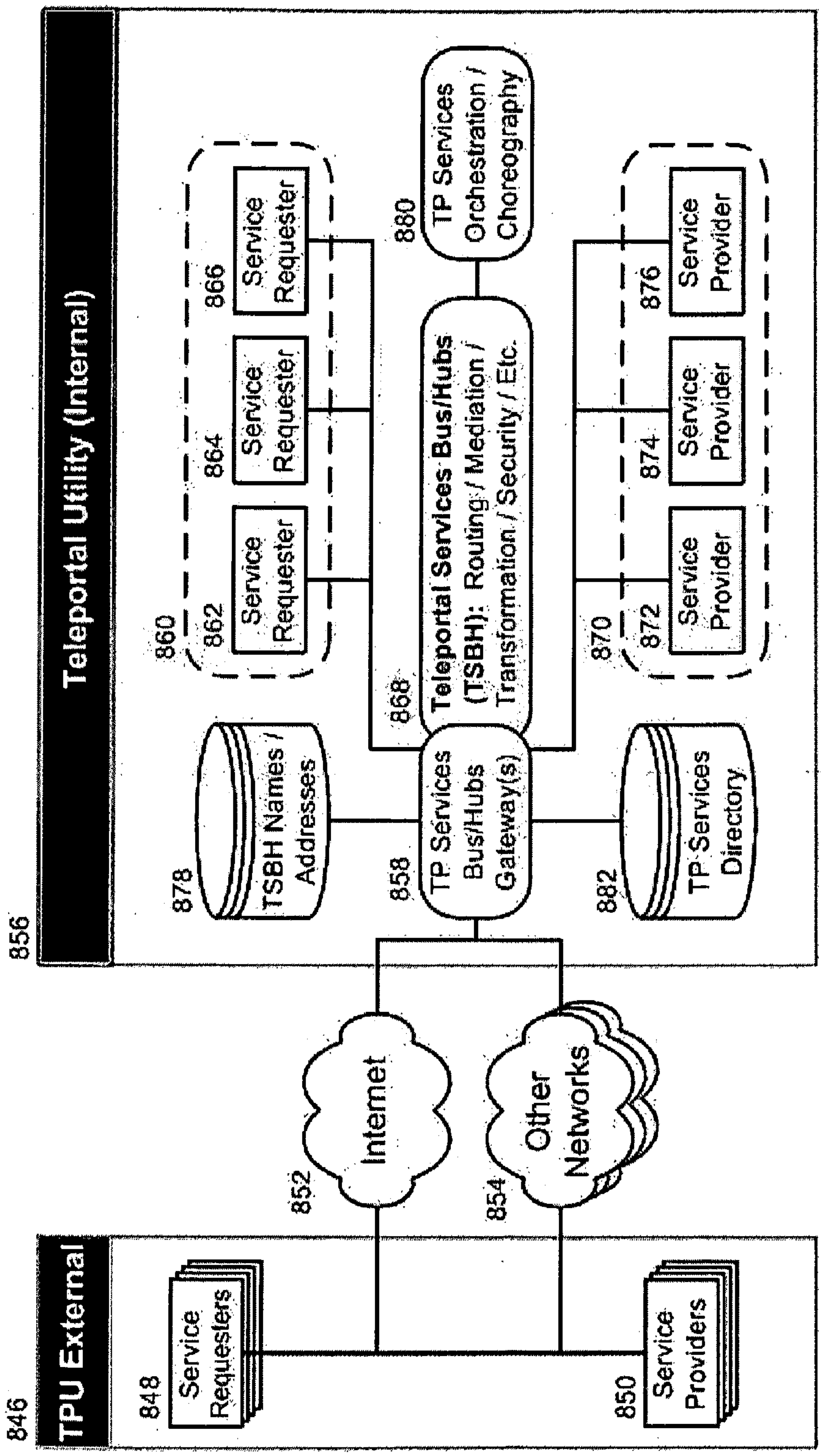

FIG. 154 is a block diagram illustrating some examples of TPU services bus/hubs.

Figure 155A:
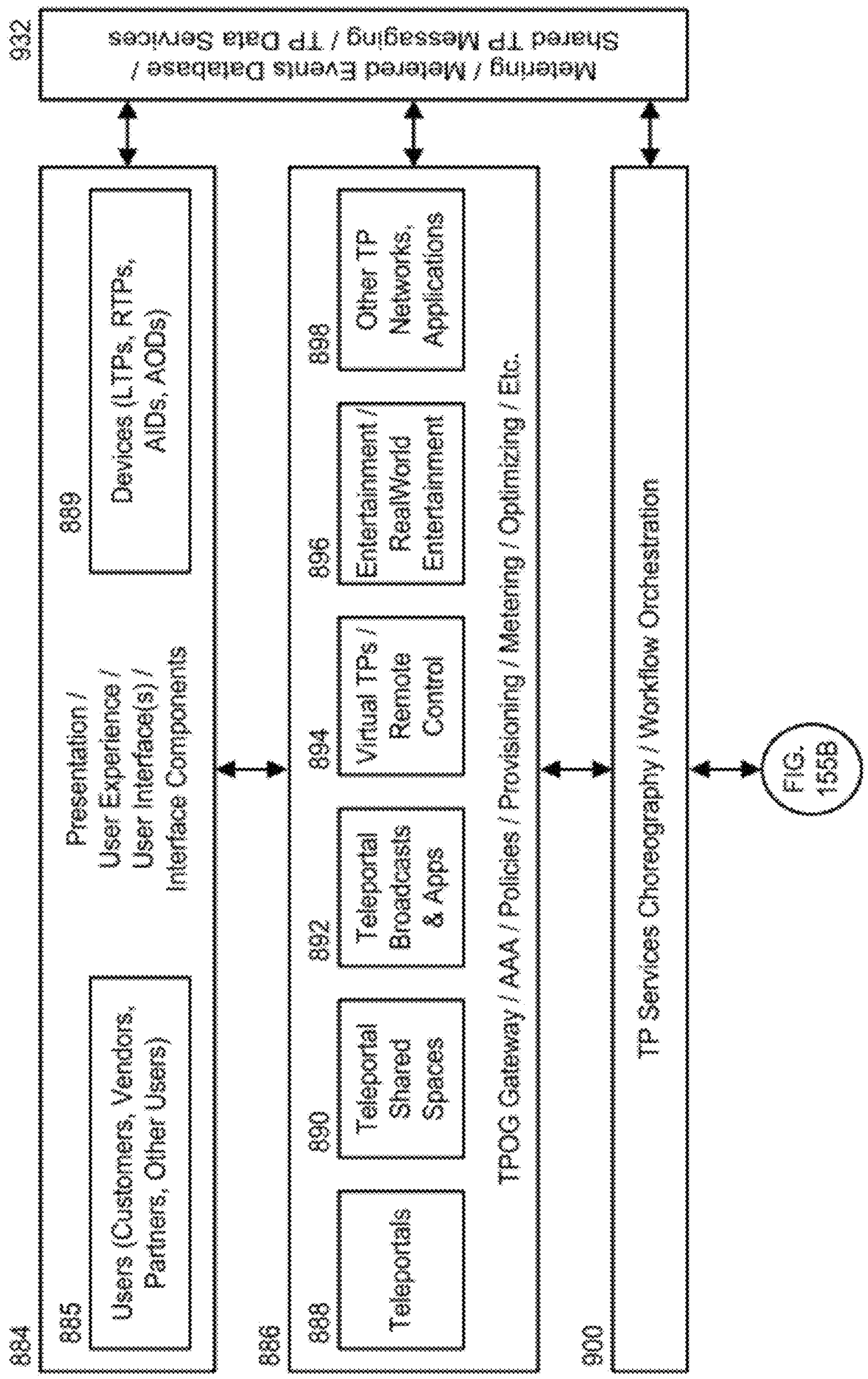
Figure 155B:
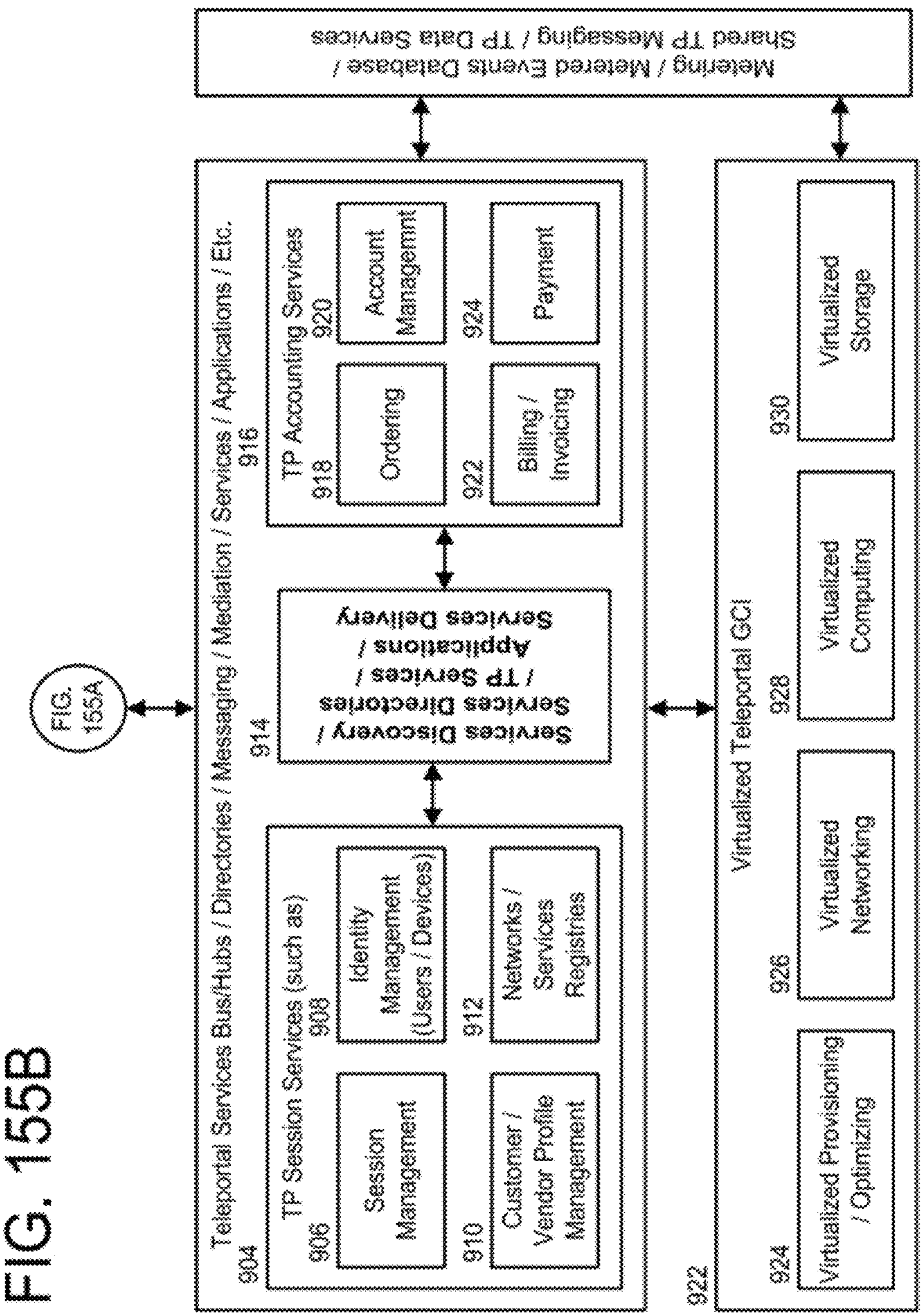
Figure 156:
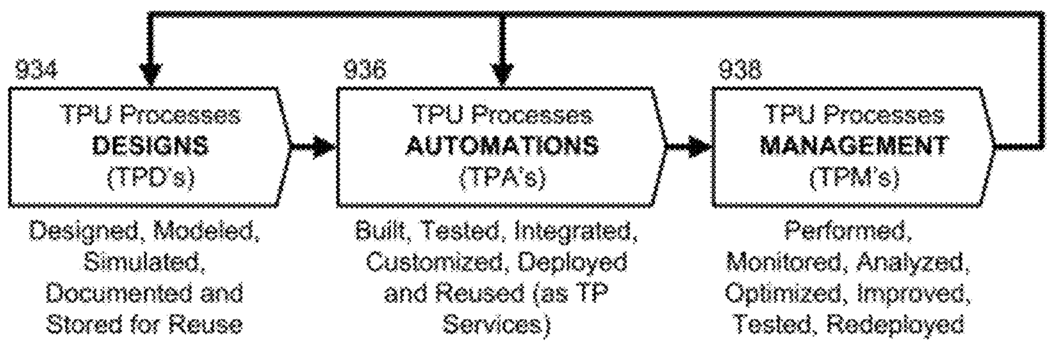

FIG. 155 is a block diagram illustrating some examples of TPU services architecture FIG. 156 is a block diagram illustrating some examples of TPU improvements processes.

Figure 157:
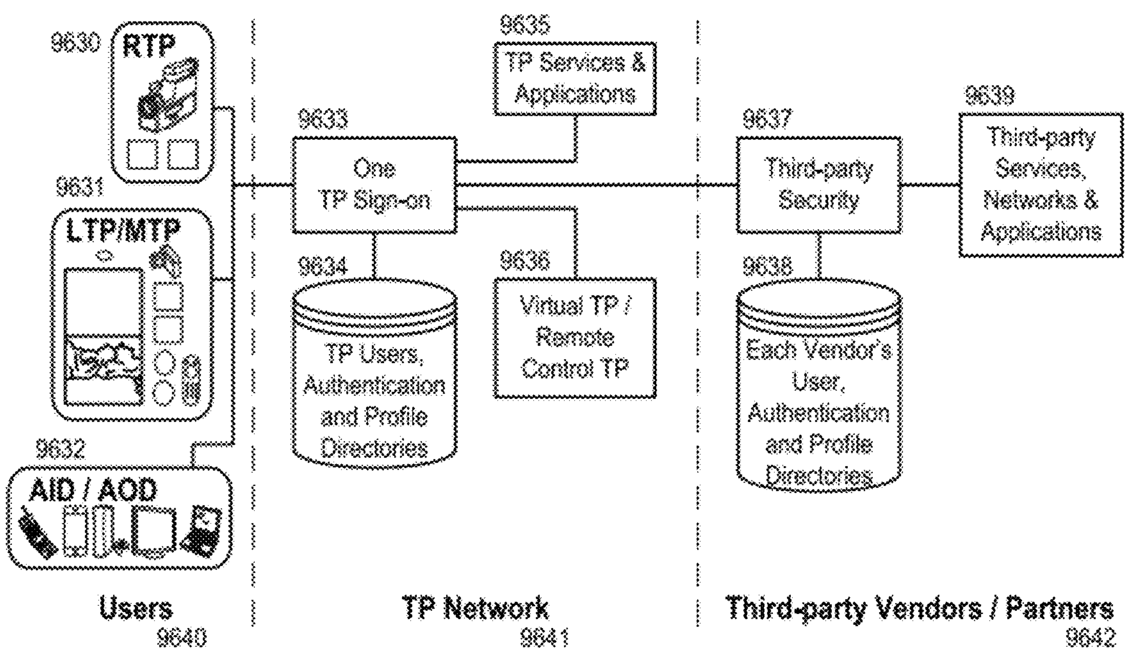

FIG. 157 is a flow chart showing some examples of procedures for a one TP sign-on service and/or process.

Figure 158:
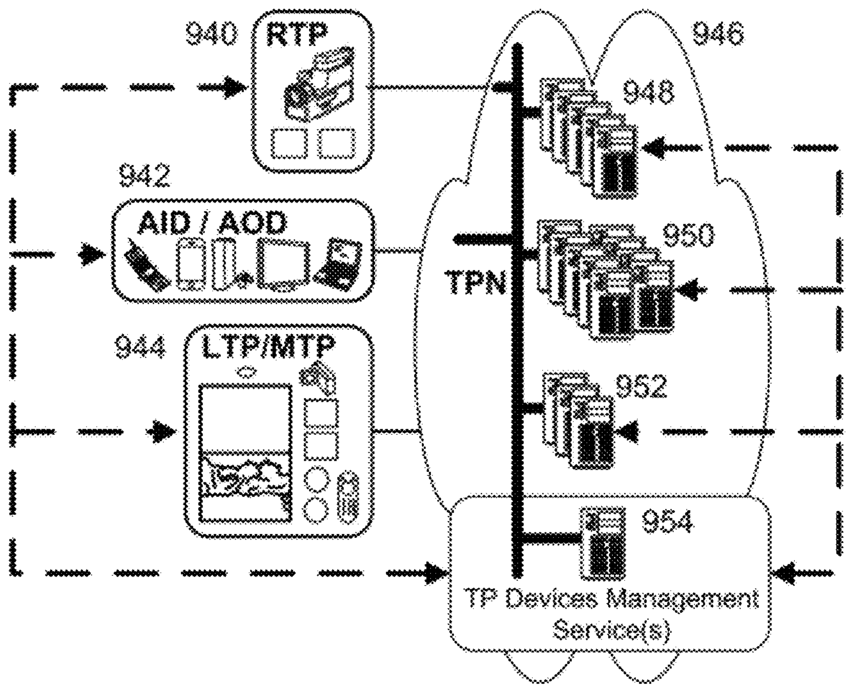

FIG. 158 is a pictorial block diagram illustrating some examples of TPU devices management.

Figure 159:
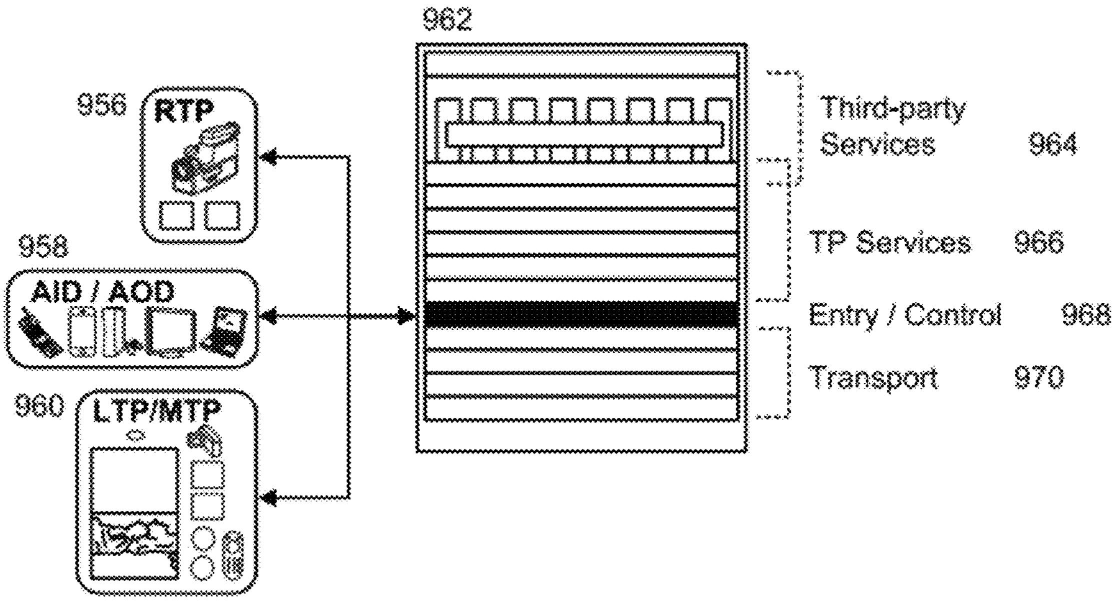

FIG. 159 is a pictorial block diagram illustrating some examples of TPU new devices discovery.

Figure 160A:
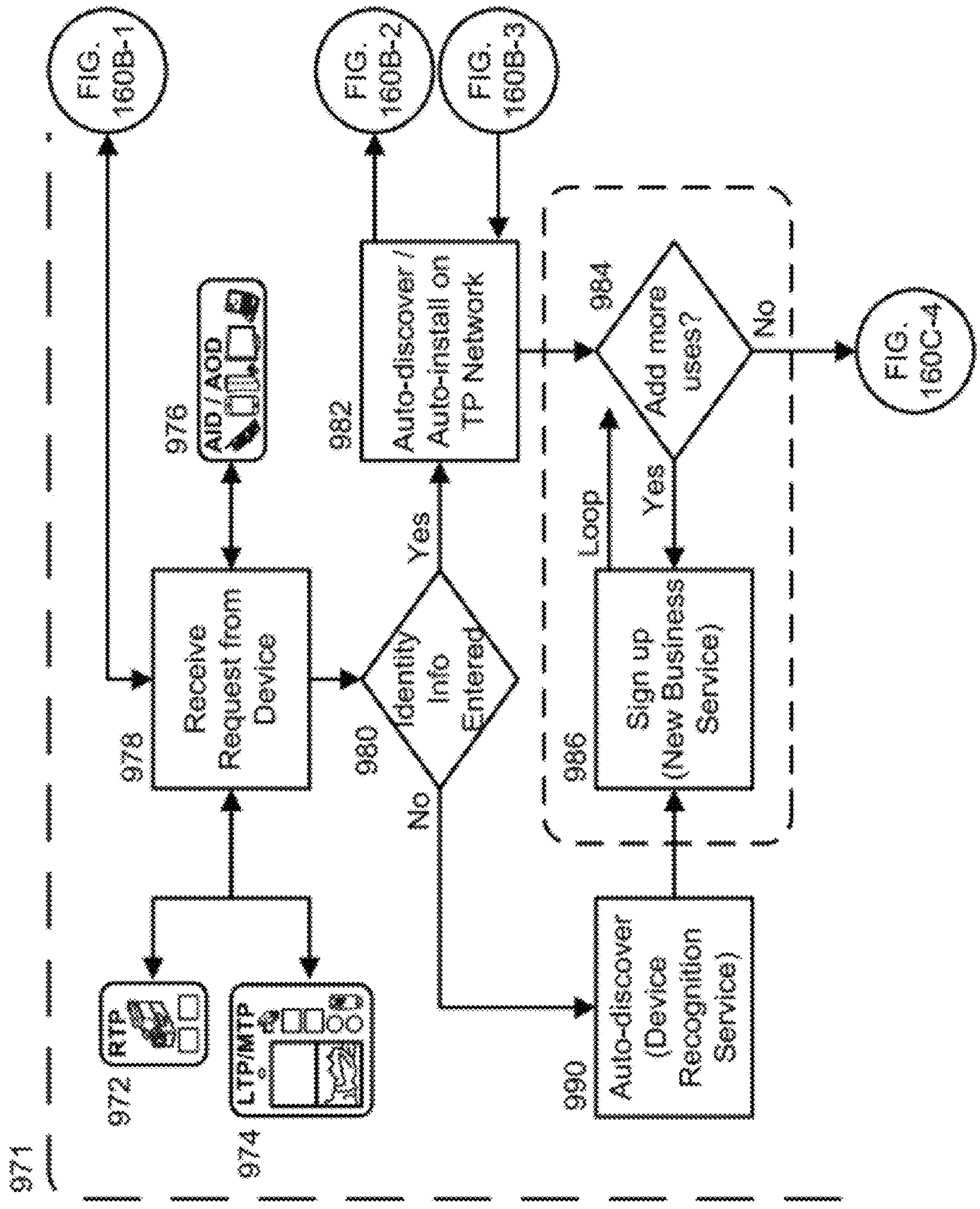
Figure 160B:
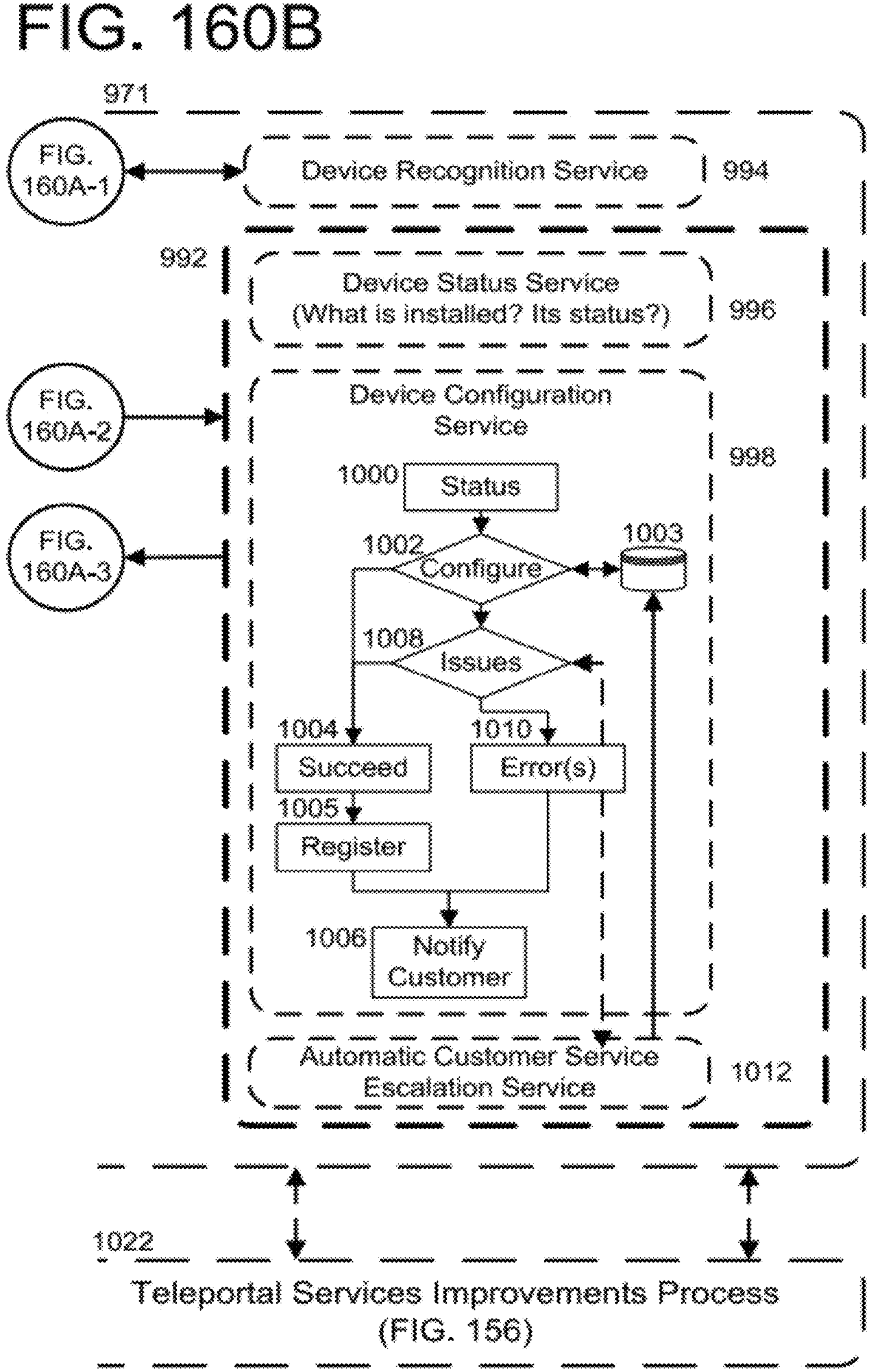
Figure 160C:
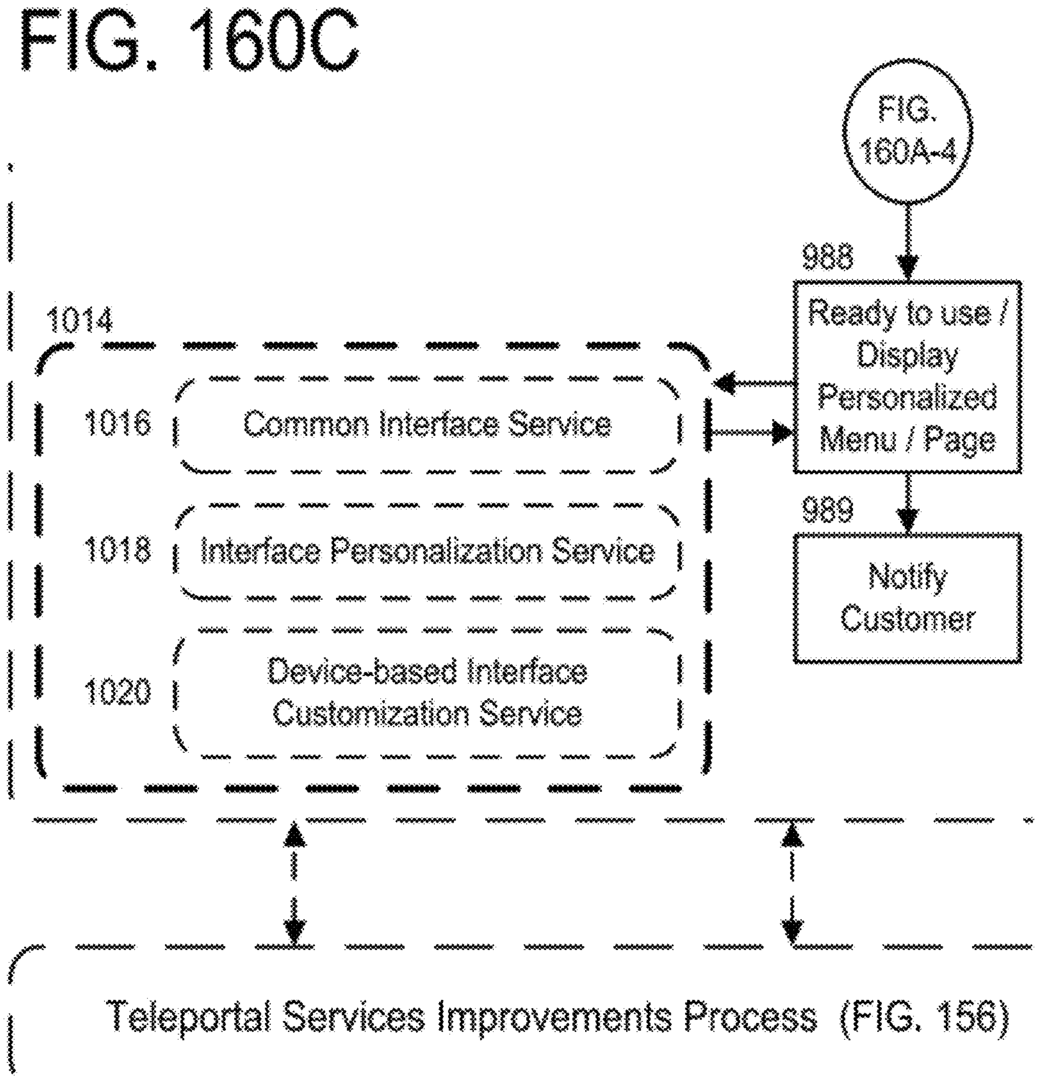

FIG. 160 is a flow chart showing some examples of procedures for devices configuration, including both automated and manual configurations.

Figure 161A:
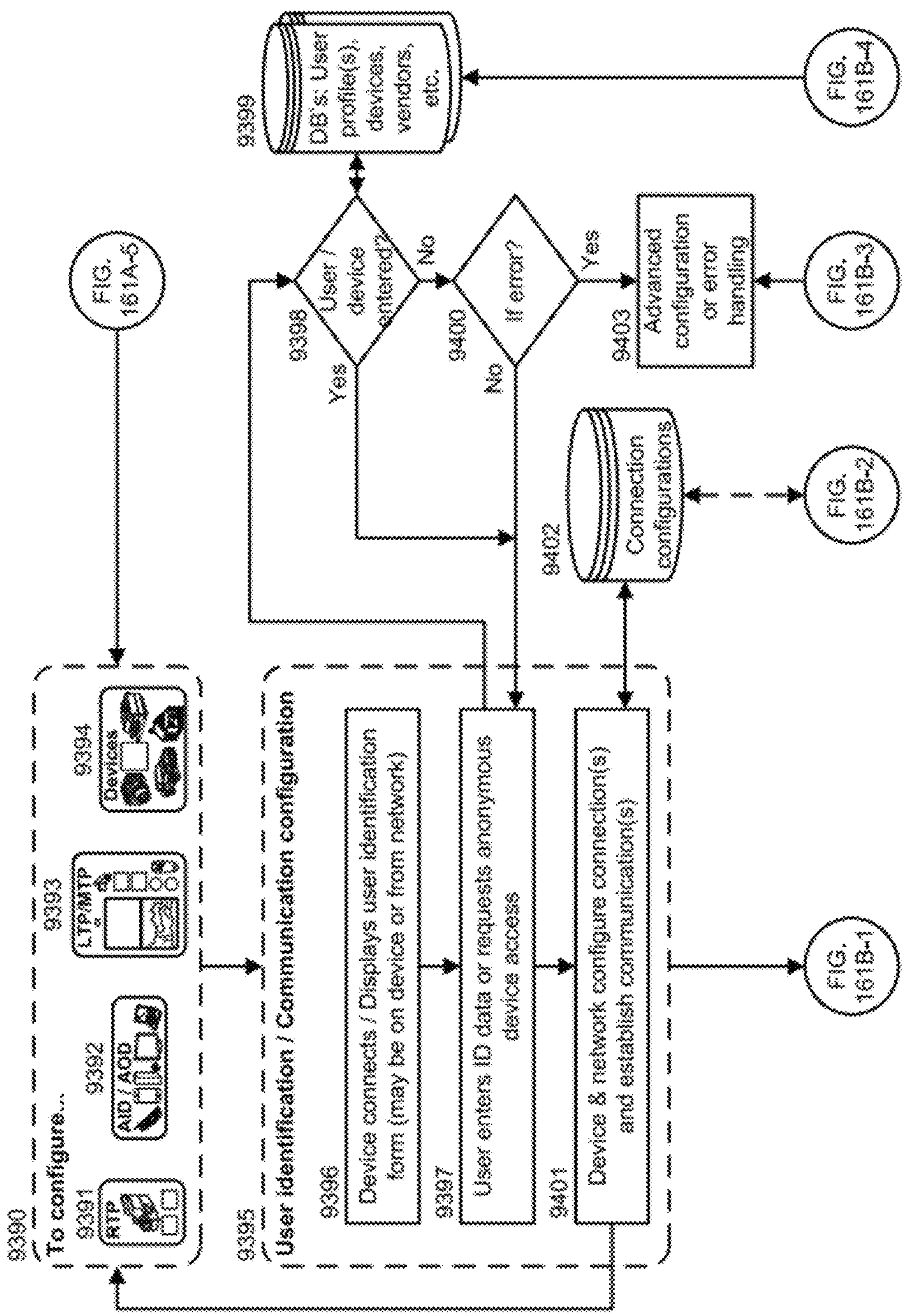
Figure 161B:
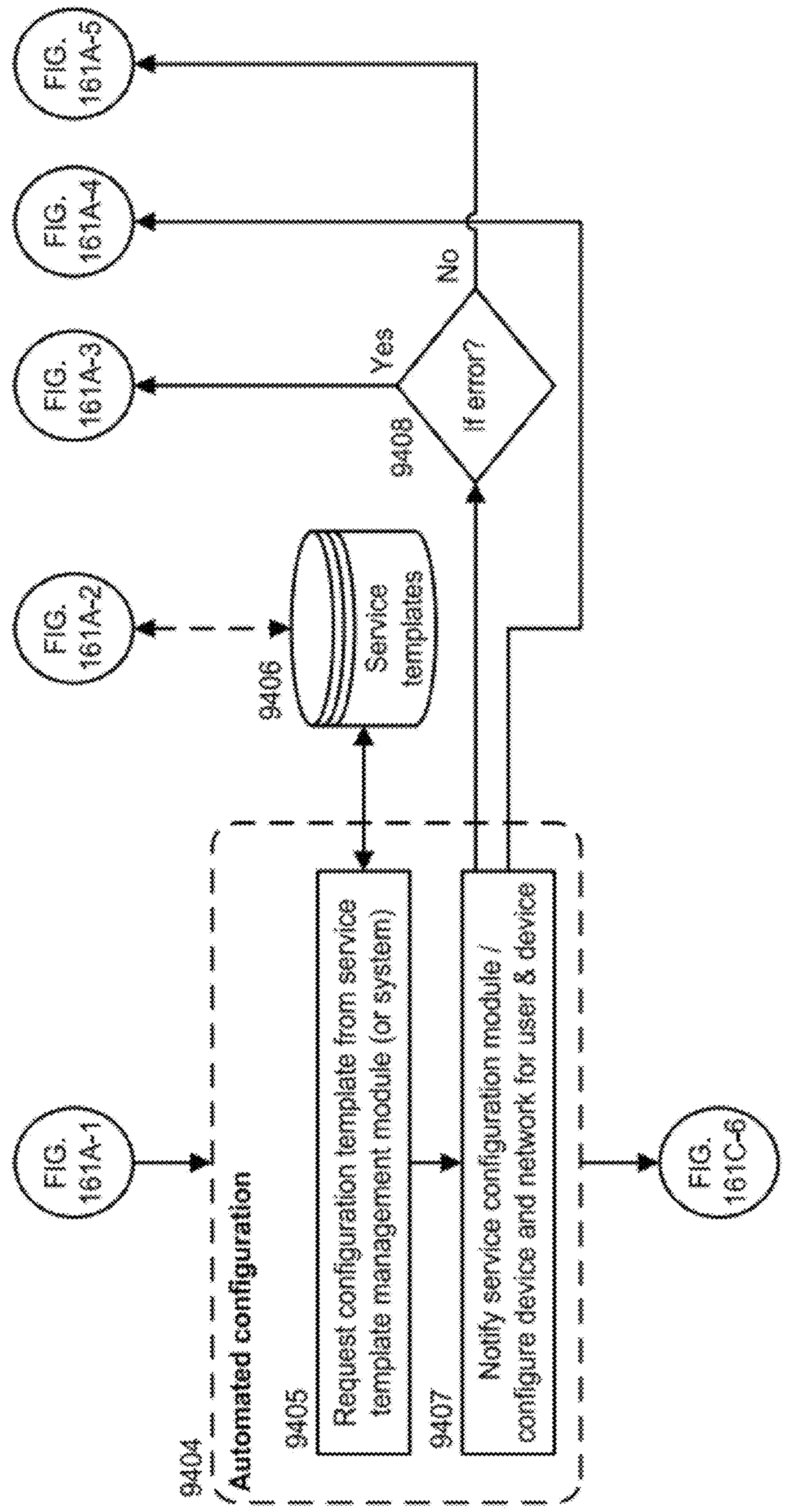
Figure 161C:
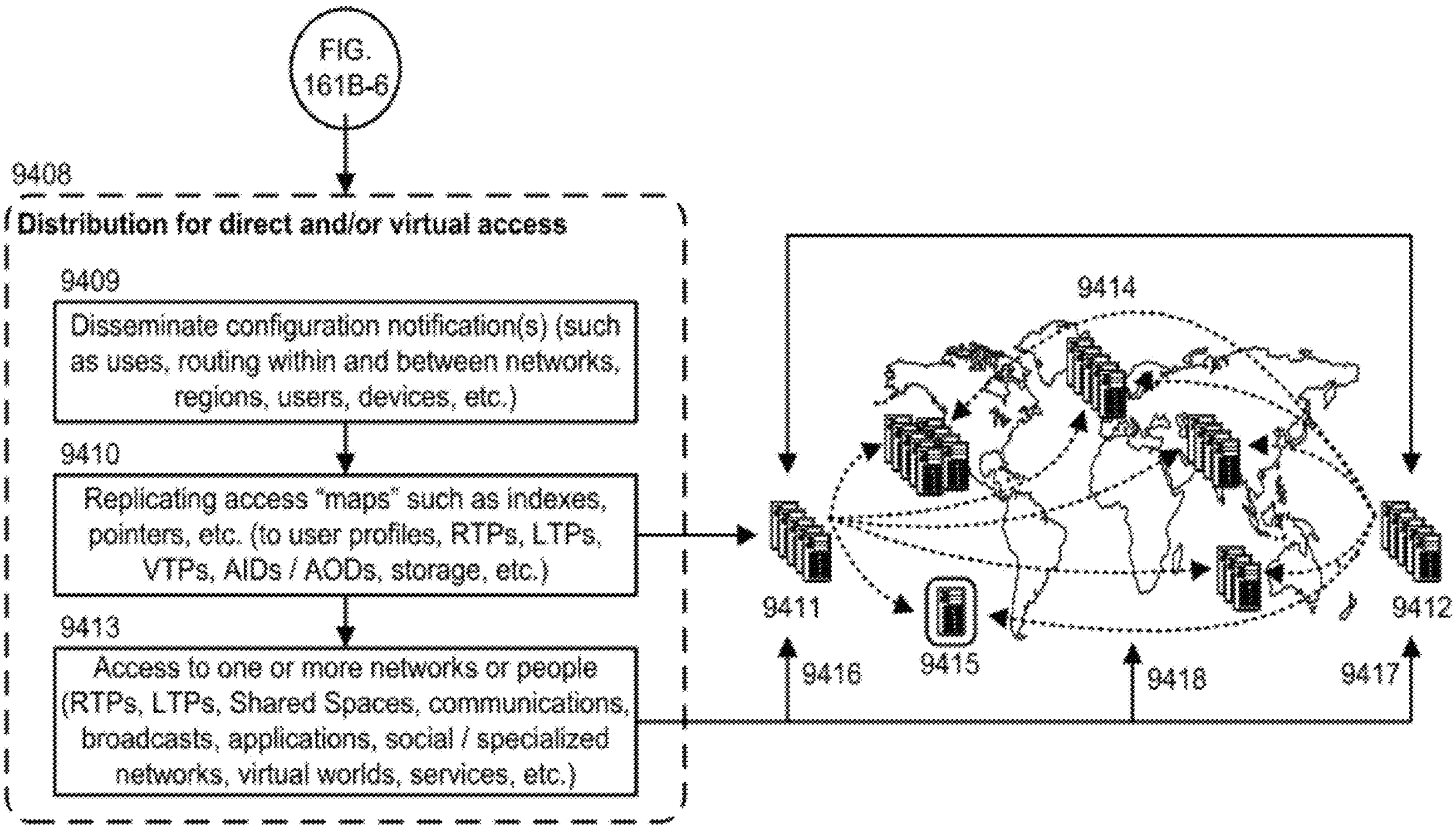

FIG. 161 is a flow chart showing some examples of procedures for new device user identification, automated configuration, and configuration distribution.

Figure 162:
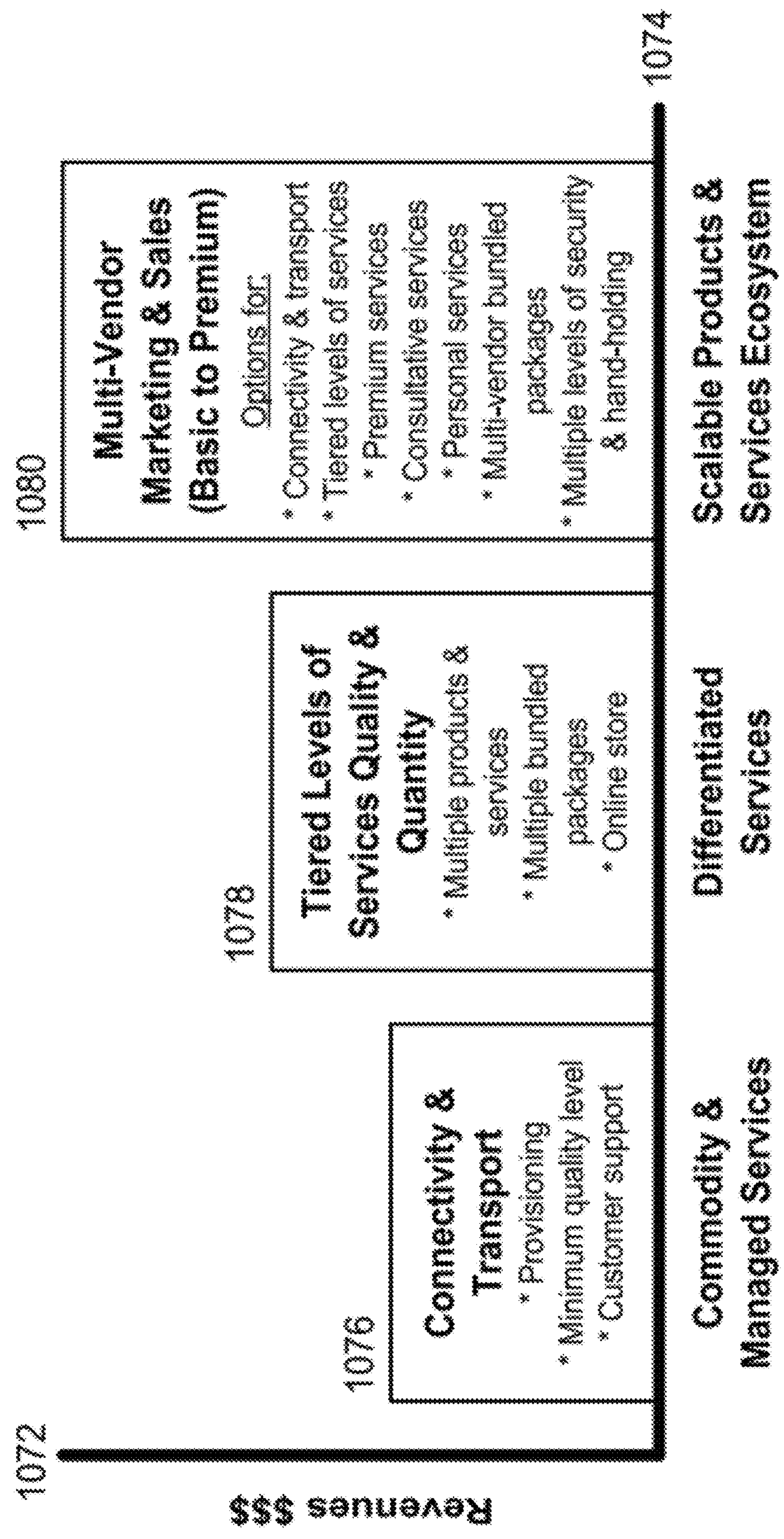

FIG. 162 is a block diagram illustrating some examples of TPU differentiated services revenues.

Figure 163:
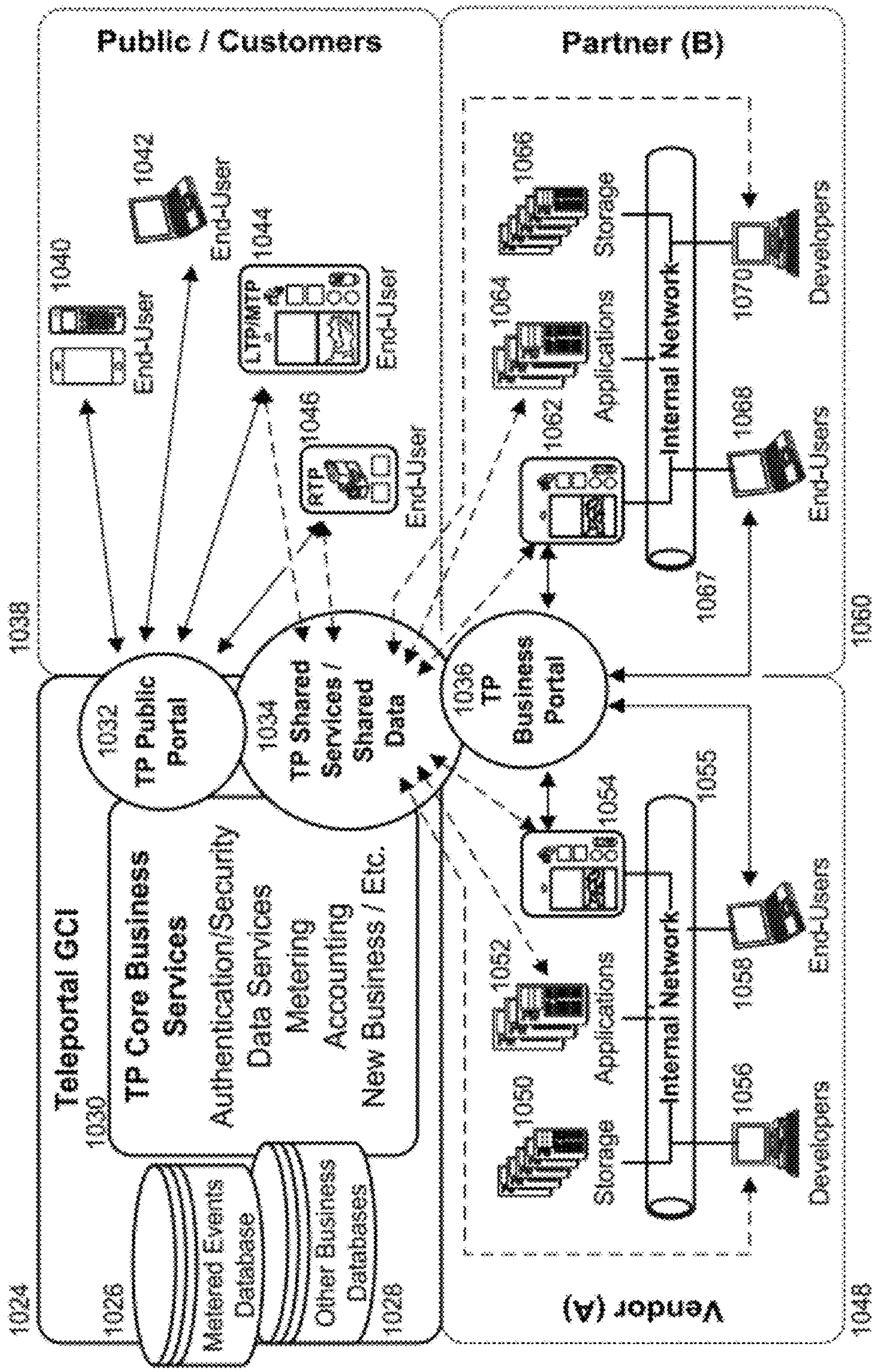

FIG. 163 is a pictorial block diagram illustrating some examples of TPU business services communications with the public, customers, vendors and partners.

Figure 164:
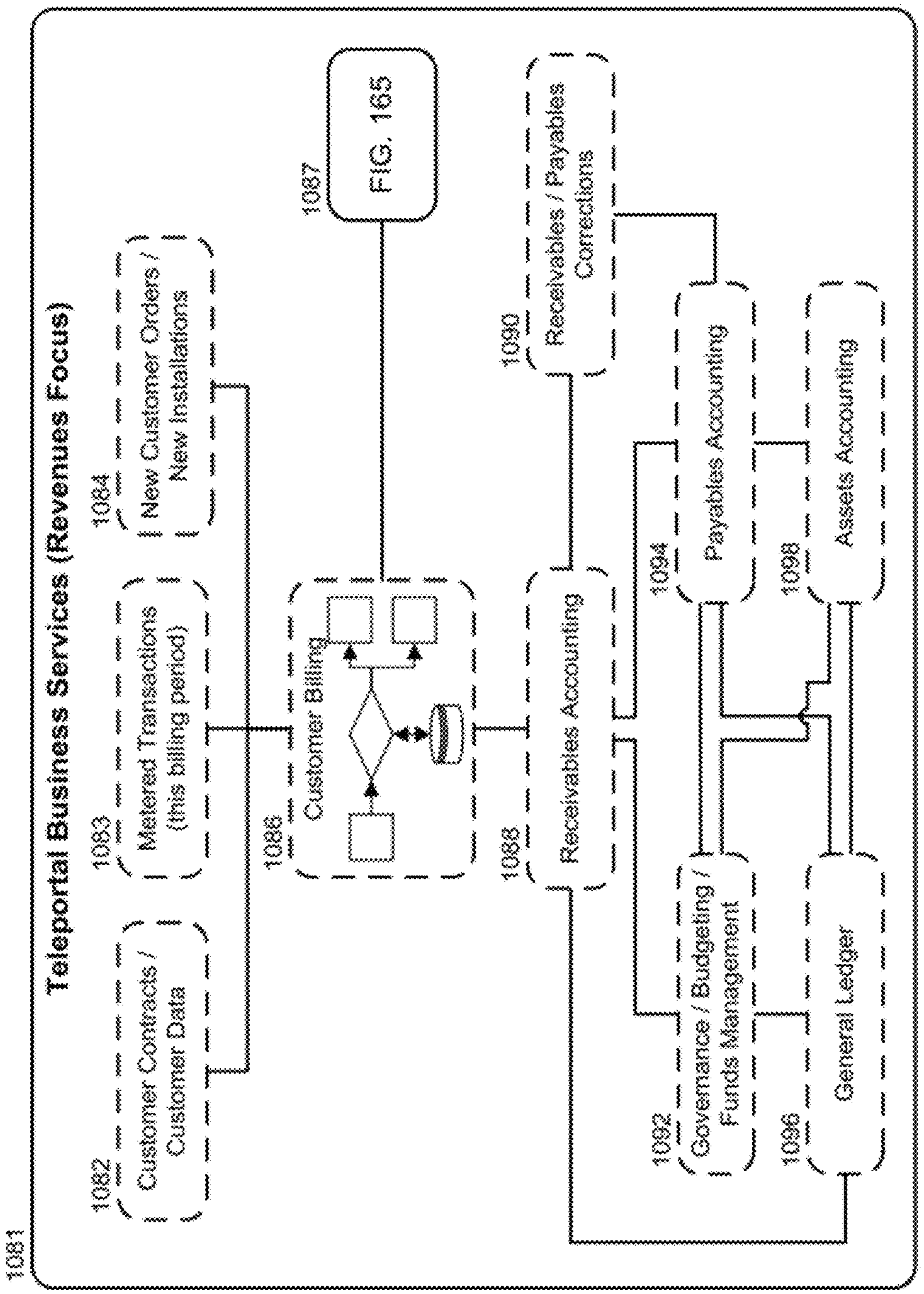

FIG. 164 is a flow chart showing some examples of procedures for a TPU business systems architecture.

Figure 165:
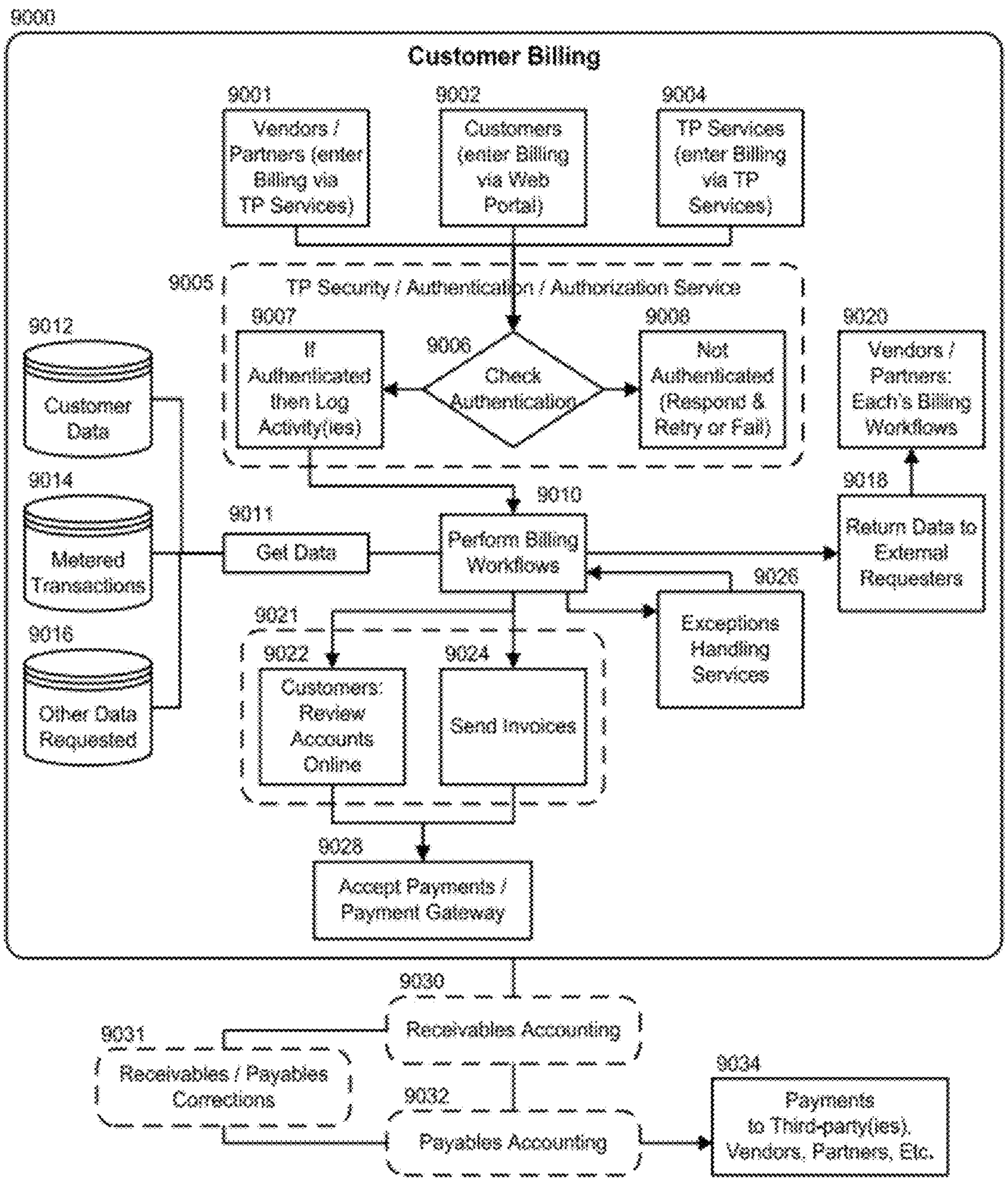

FIG. 165 is a flow chart showing some examples of procedures for an example TPU customer billing system simultaneously accessible to customers, vendors, partners, and TP services; enabling appropriate data retrieval, payments and revenues for each party.

FIG. 166 is a table illustrating some examples of current uses of personal identities (prior art).

Figure 167:
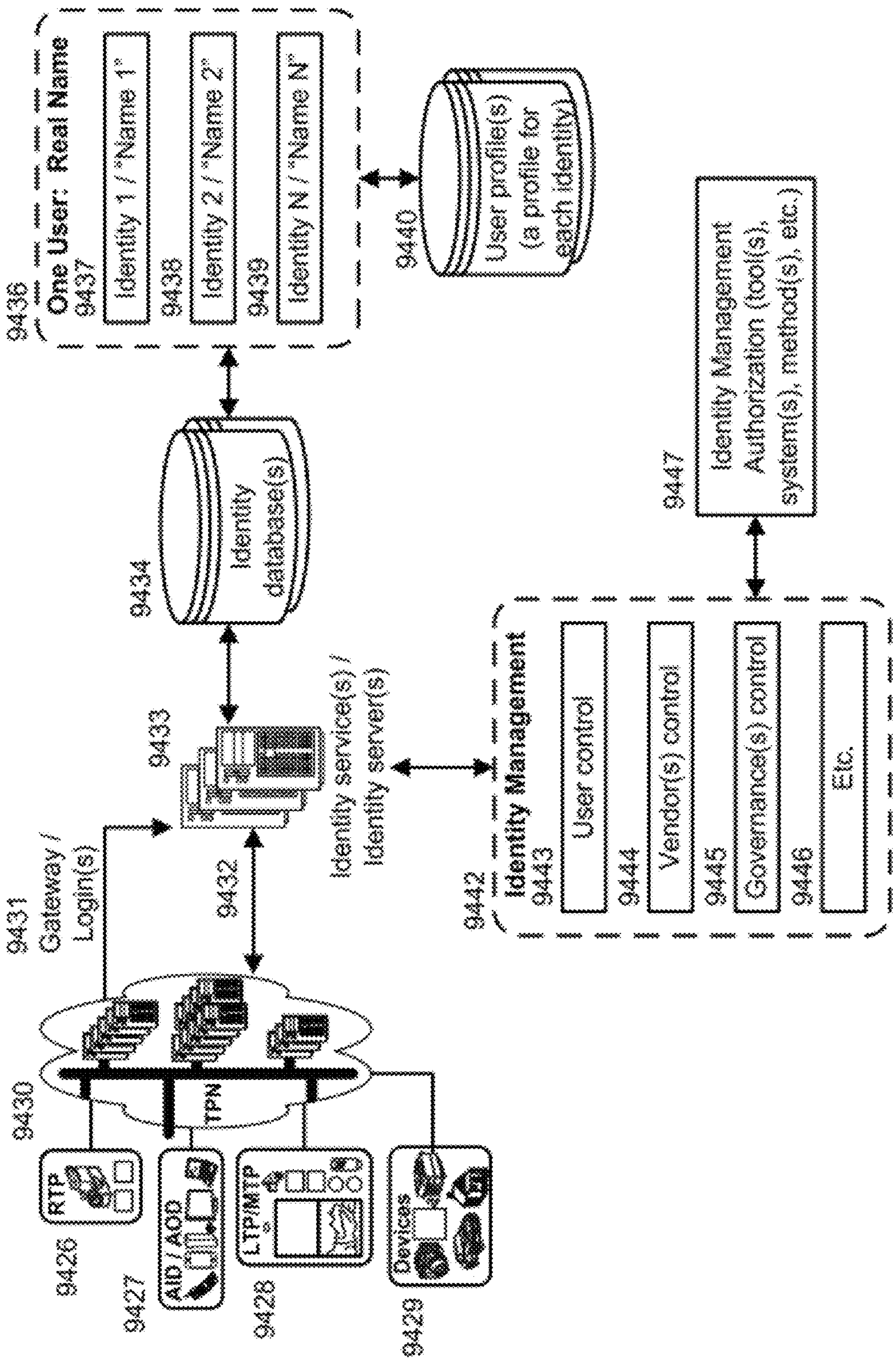

FIG. 167 is a block diagram illustrating some examples of multiple identities by identity service(s), identity server(s), etc.

FIG. 168 is a table illustrating some examples of multiple identities for one person.

Figure 169:
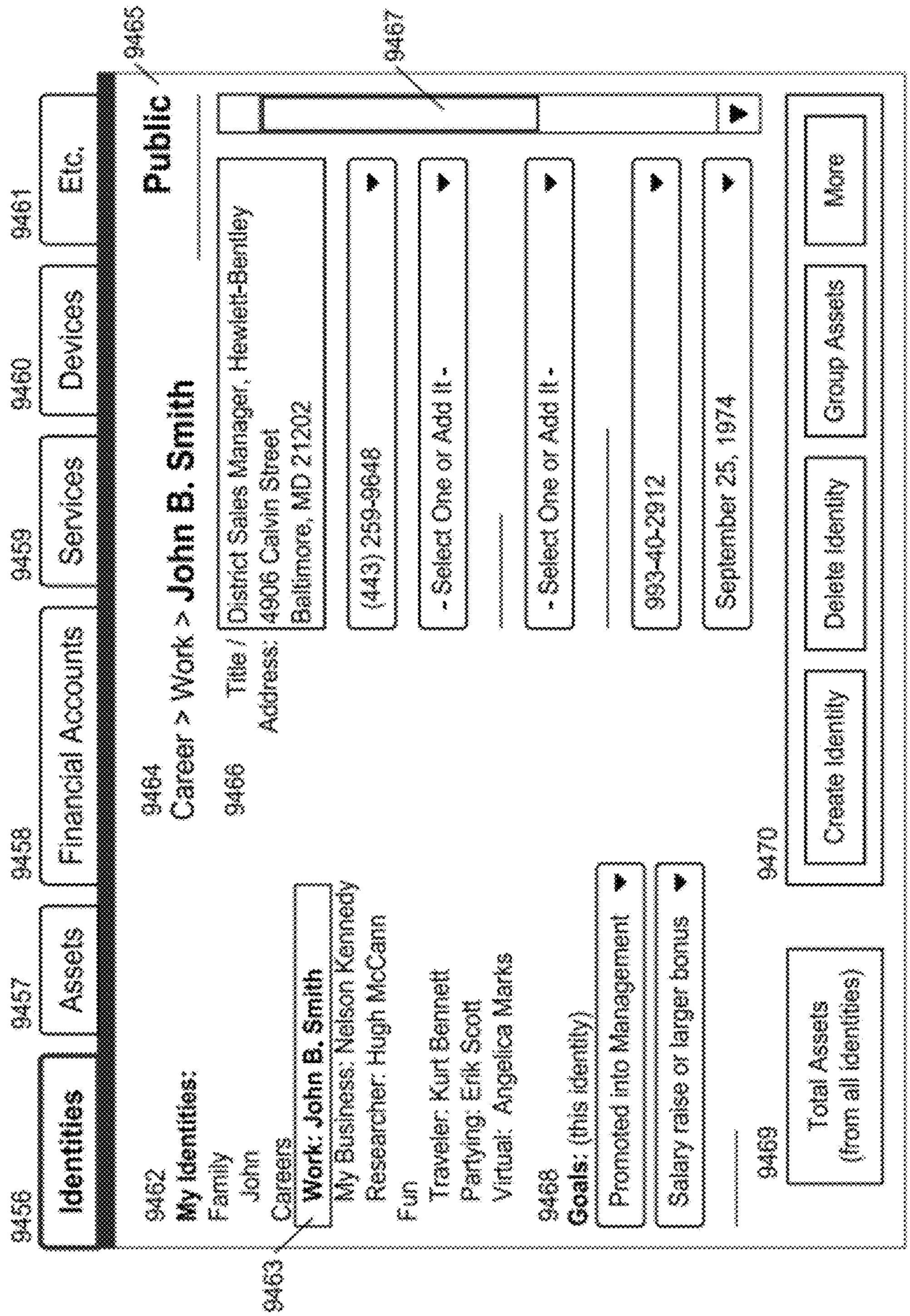

FIG. 169 is a pictorial diagram illustrating an example of a user's identities management.

Figure 170:
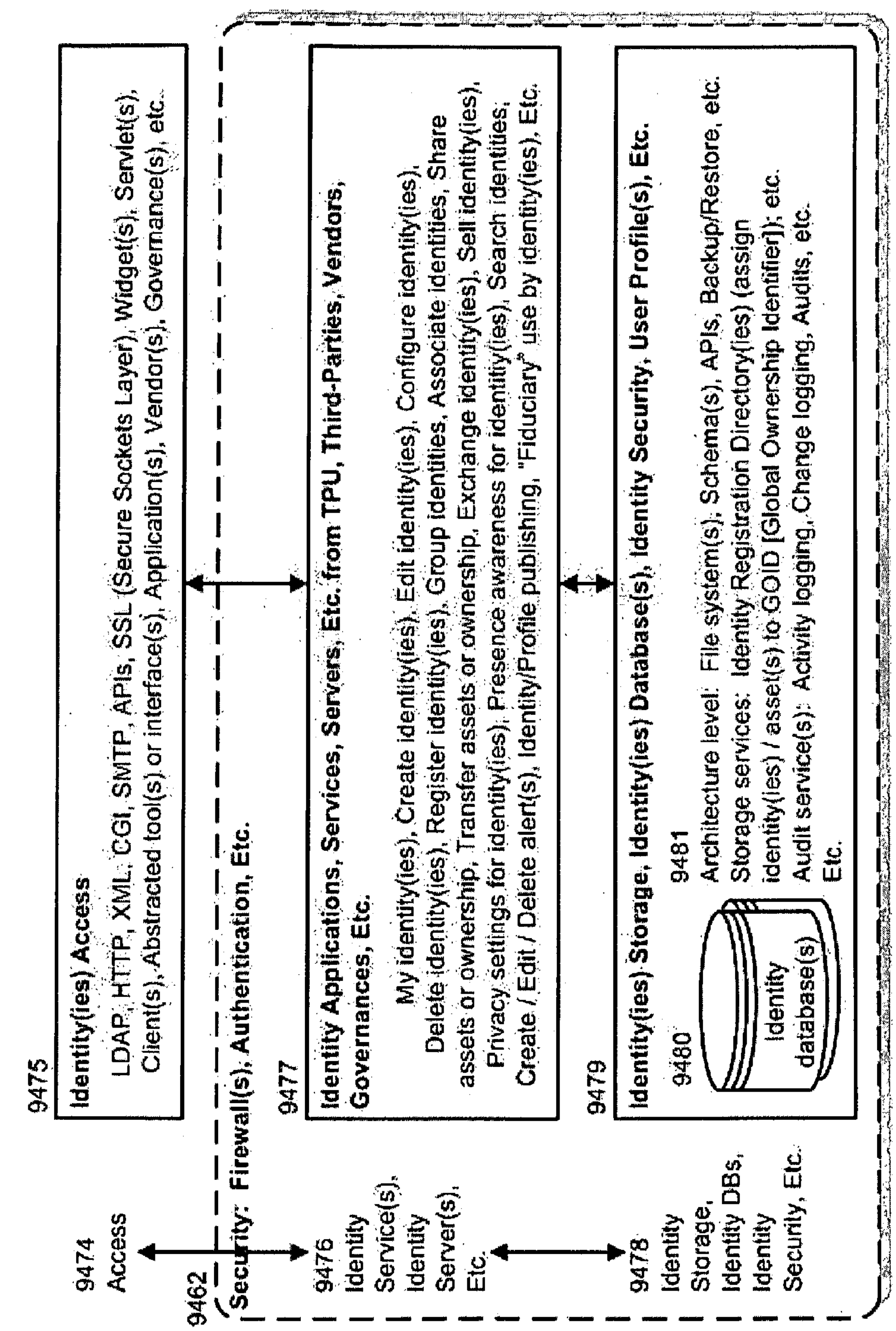

FIG. 170 is a block diagram showing some examples of an abstracted architecture for identity service(s), identity server (s), etc.

Figure 171:
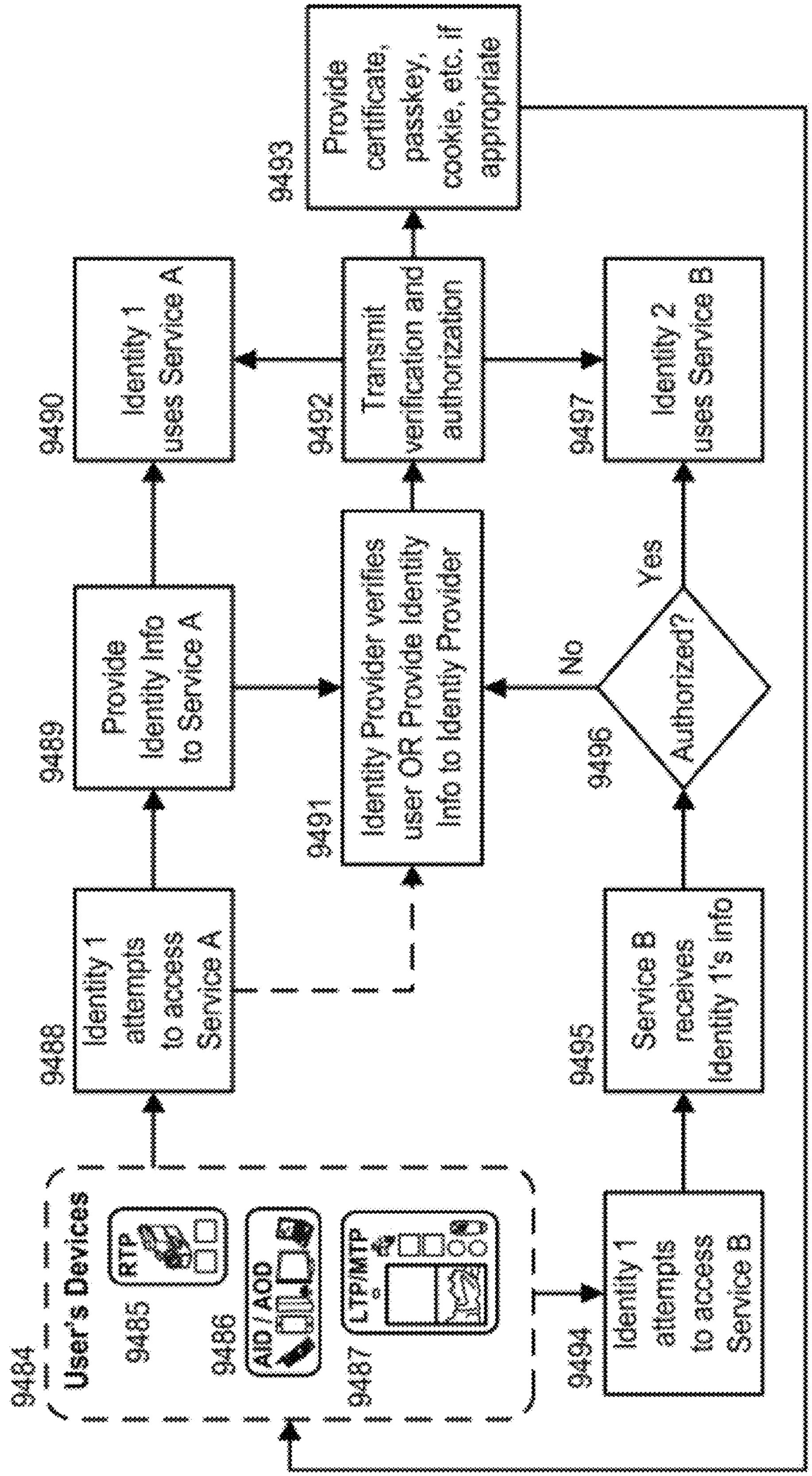

FIG. 171 is a flow chart showing some examples of procedures for setup and/or single sign-on for multiple identities and their services, devices, vendors, etc.

Figure 172A:
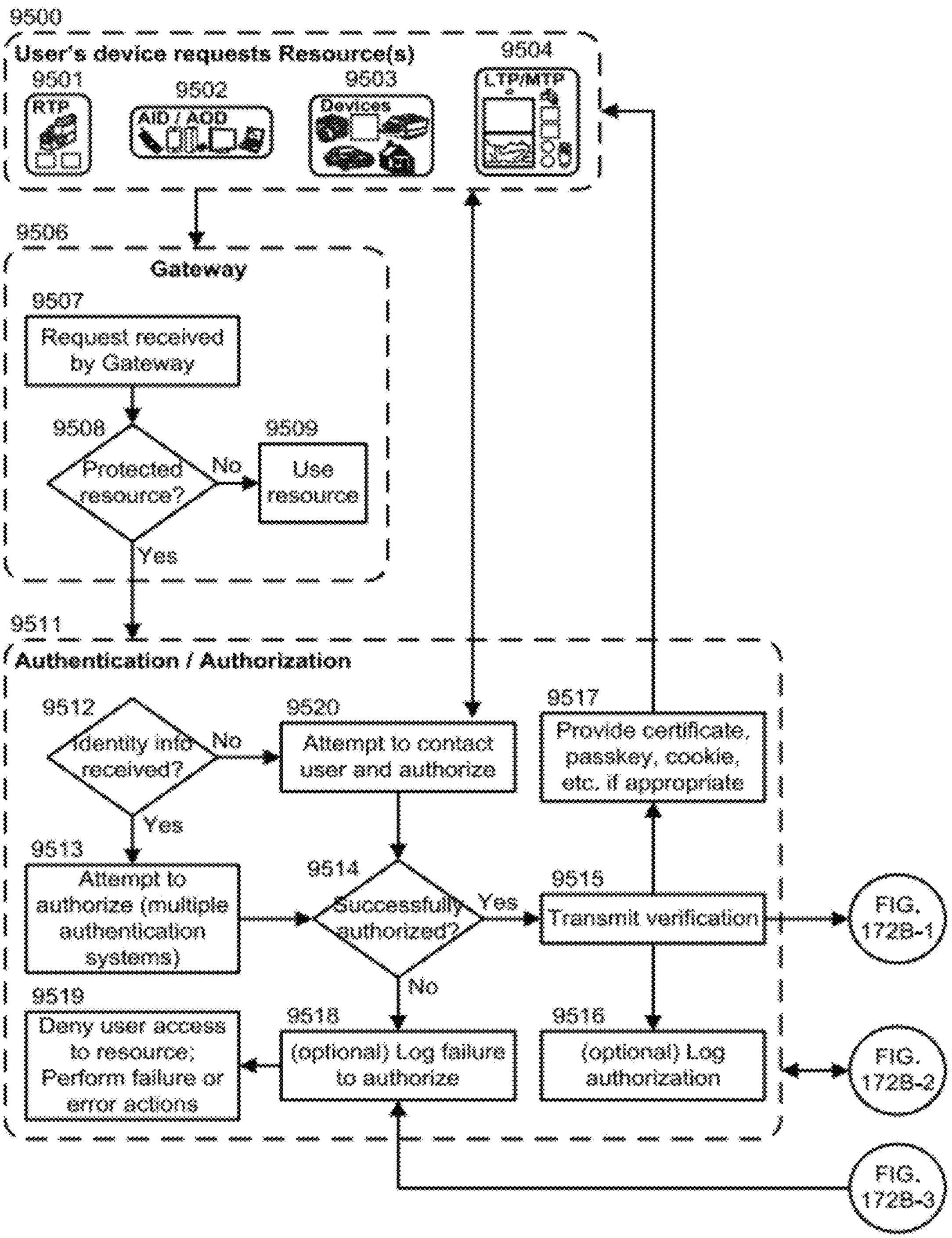
Figure 172B:
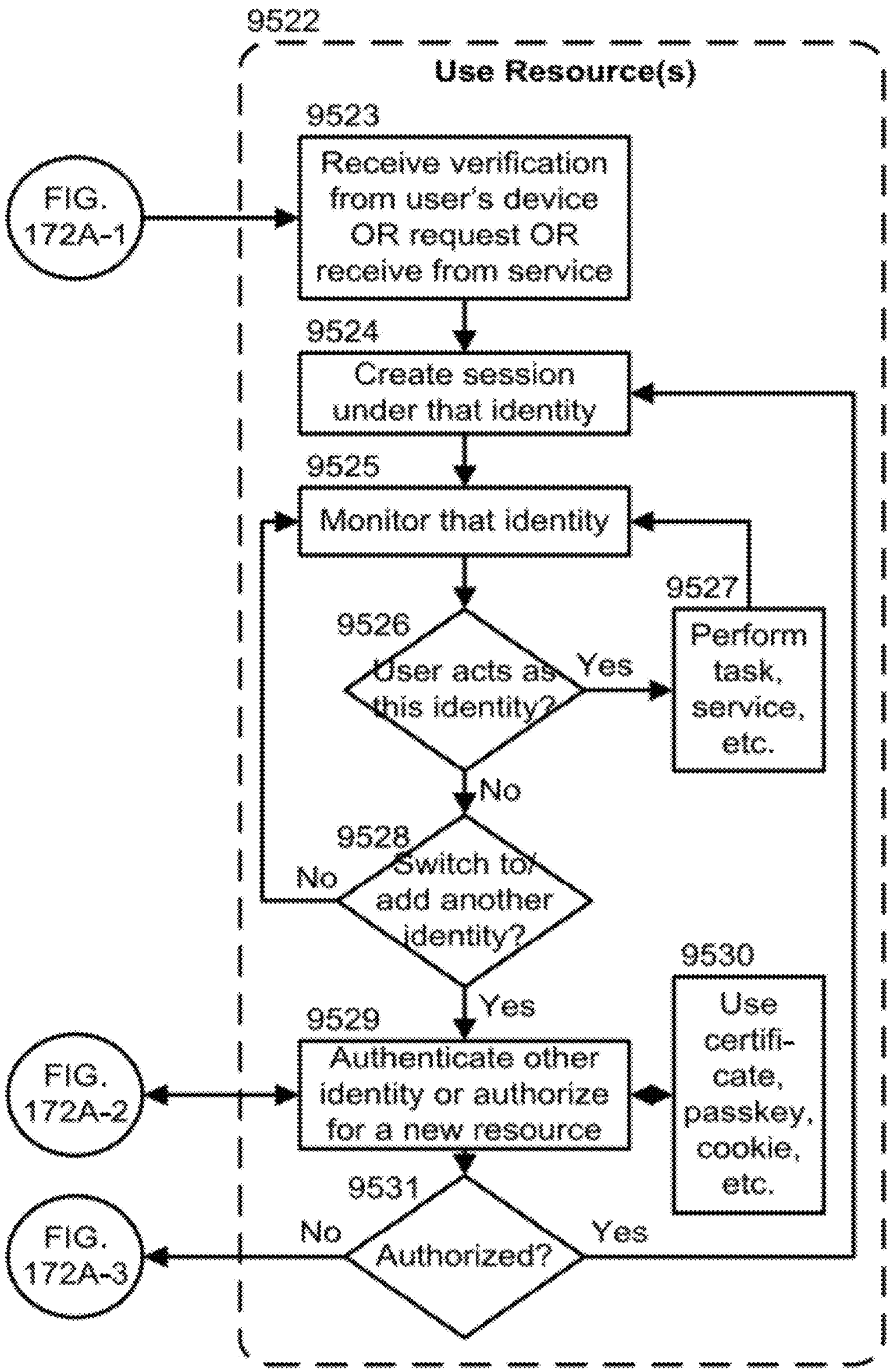

FIG. 172 is a flow chart showing some examples of procedures for a gateway, authentication, authorization and resources use by multiple identities.

Figure 173A:
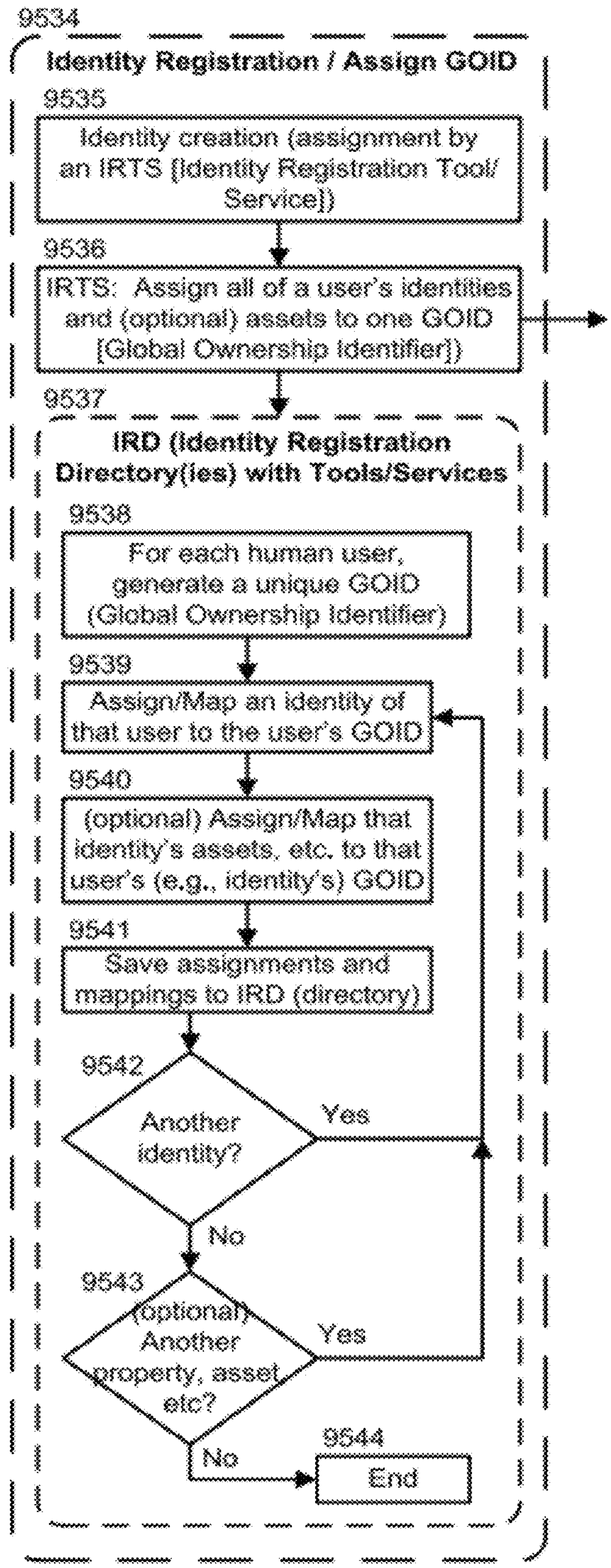
Figure 173B:
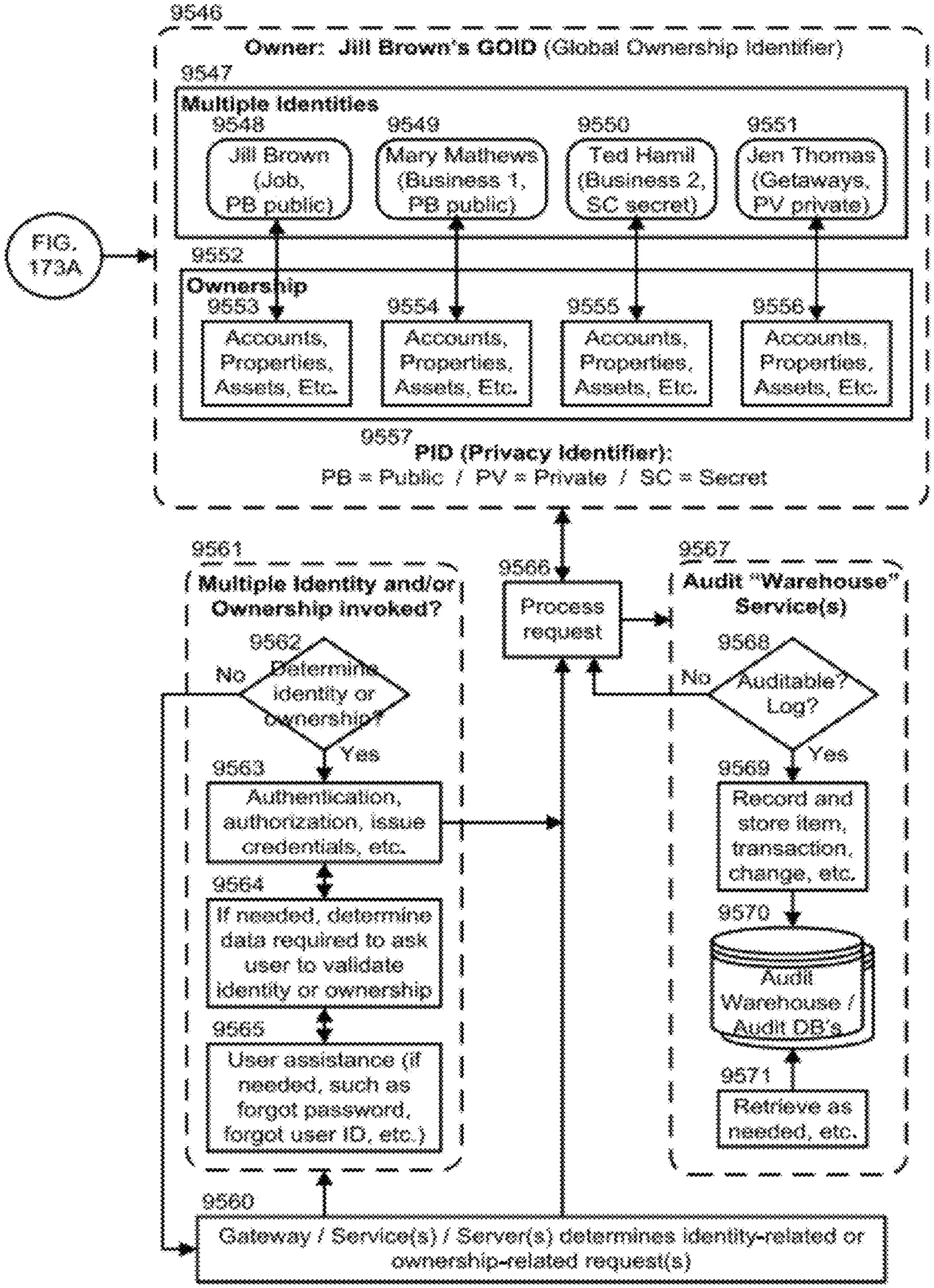

FIG. 173 is a flow chart showing some examples of procedures for a person's multiple identities ownership of assets and property with authentication and auditing.

Figure 174A:
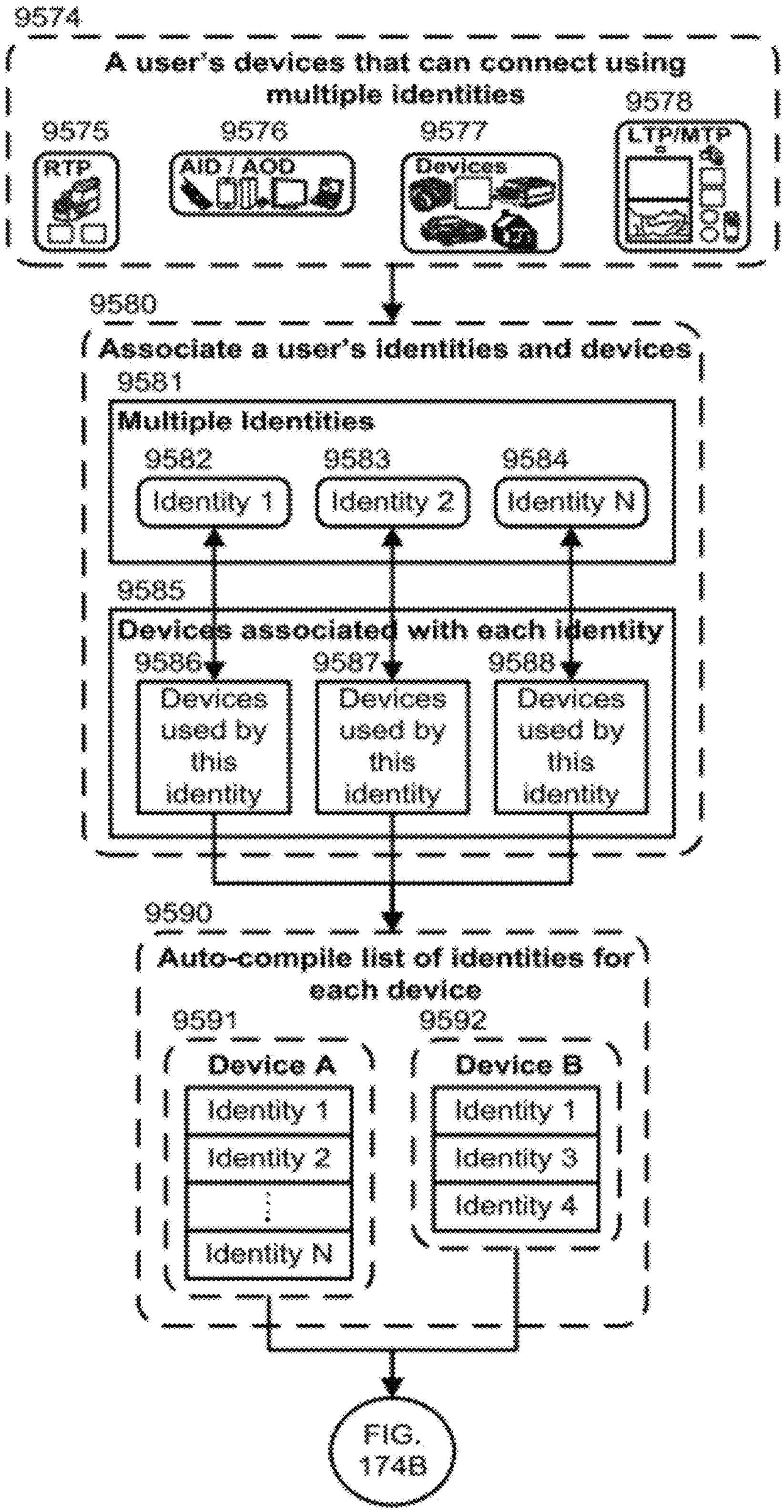
Figure 174B:
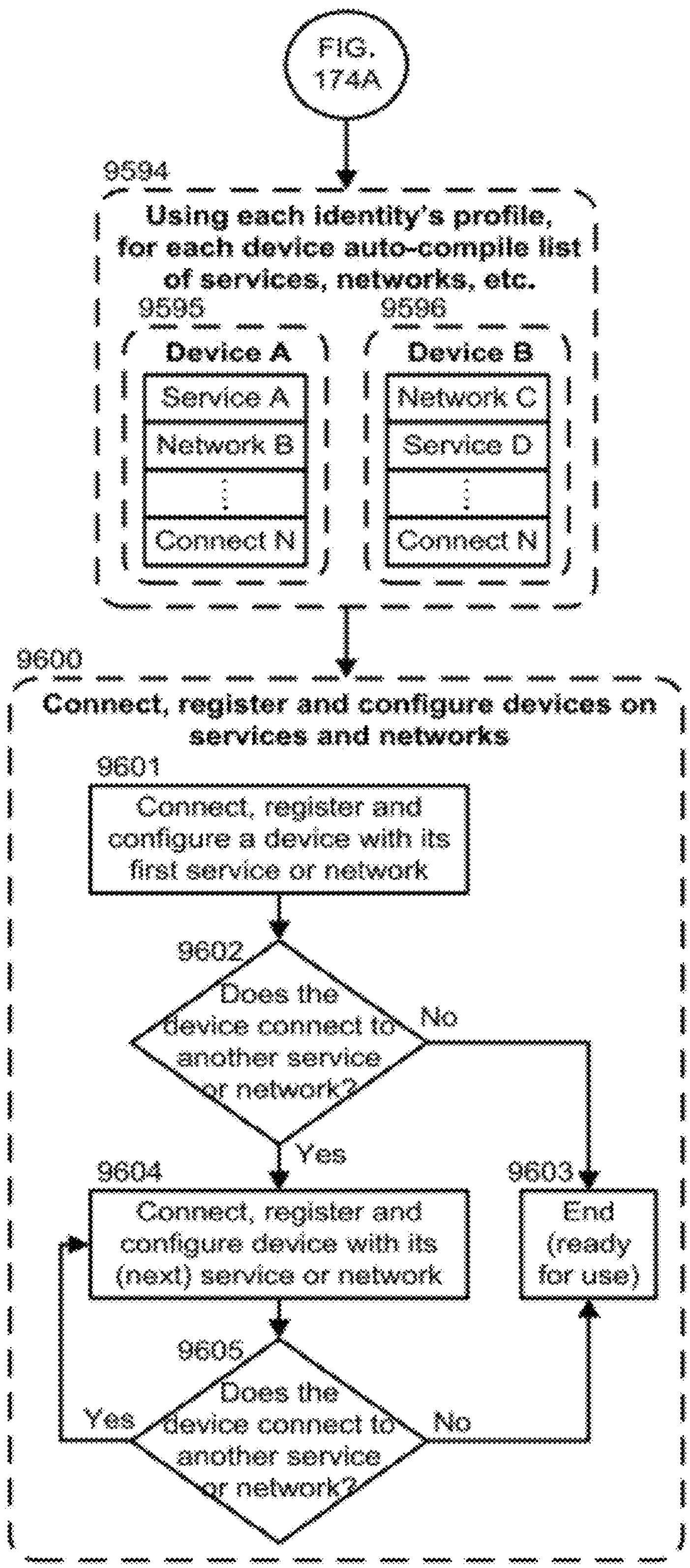

FIG. 174 is a flow chart showing some examples of procedures for setup of devices for use by multiple identities.

Figure 175:
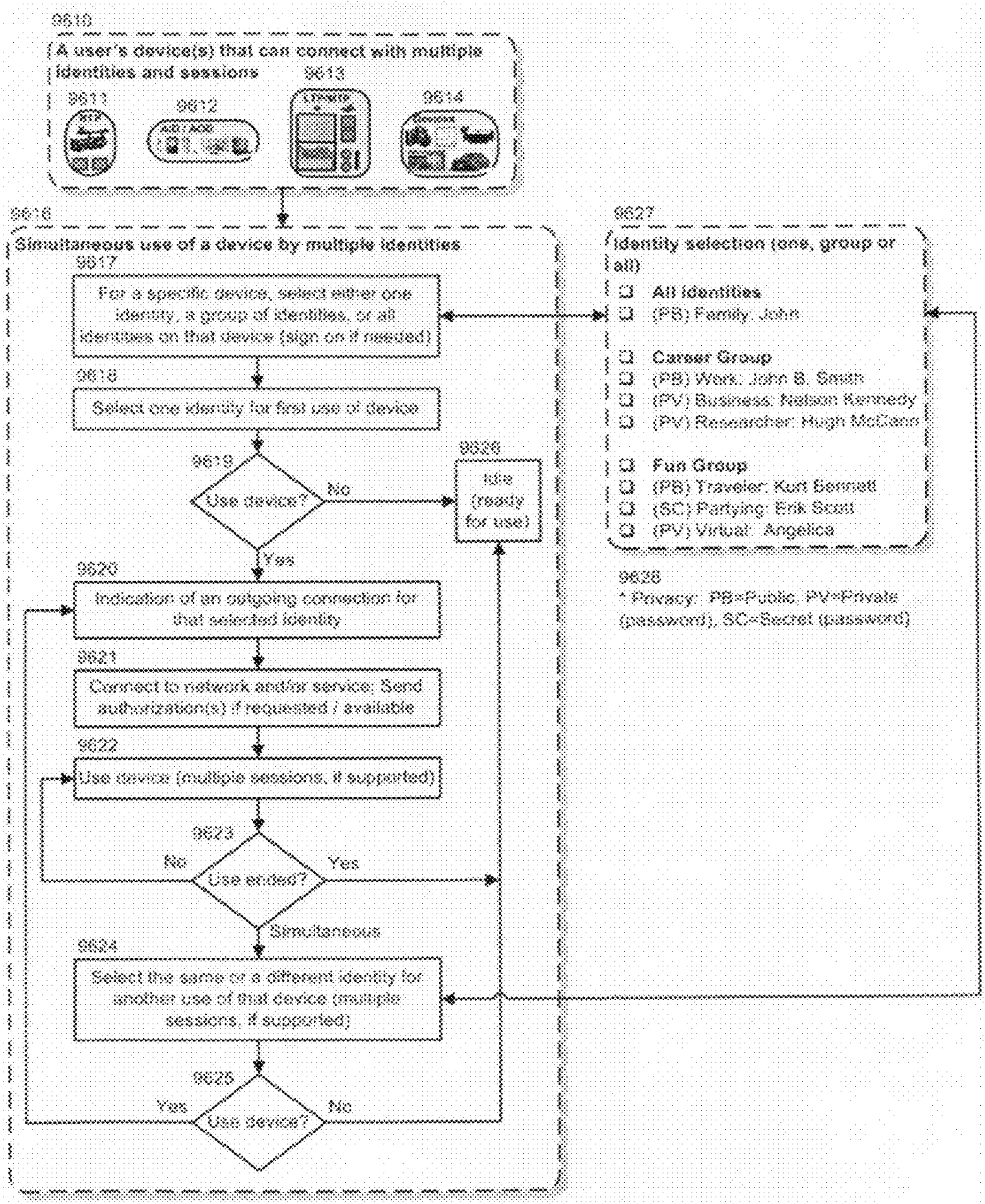

FIG. 175 is a flow chart showing some examples of procedures for the simultaneous use of a device by multiple identities.

Figure 176:
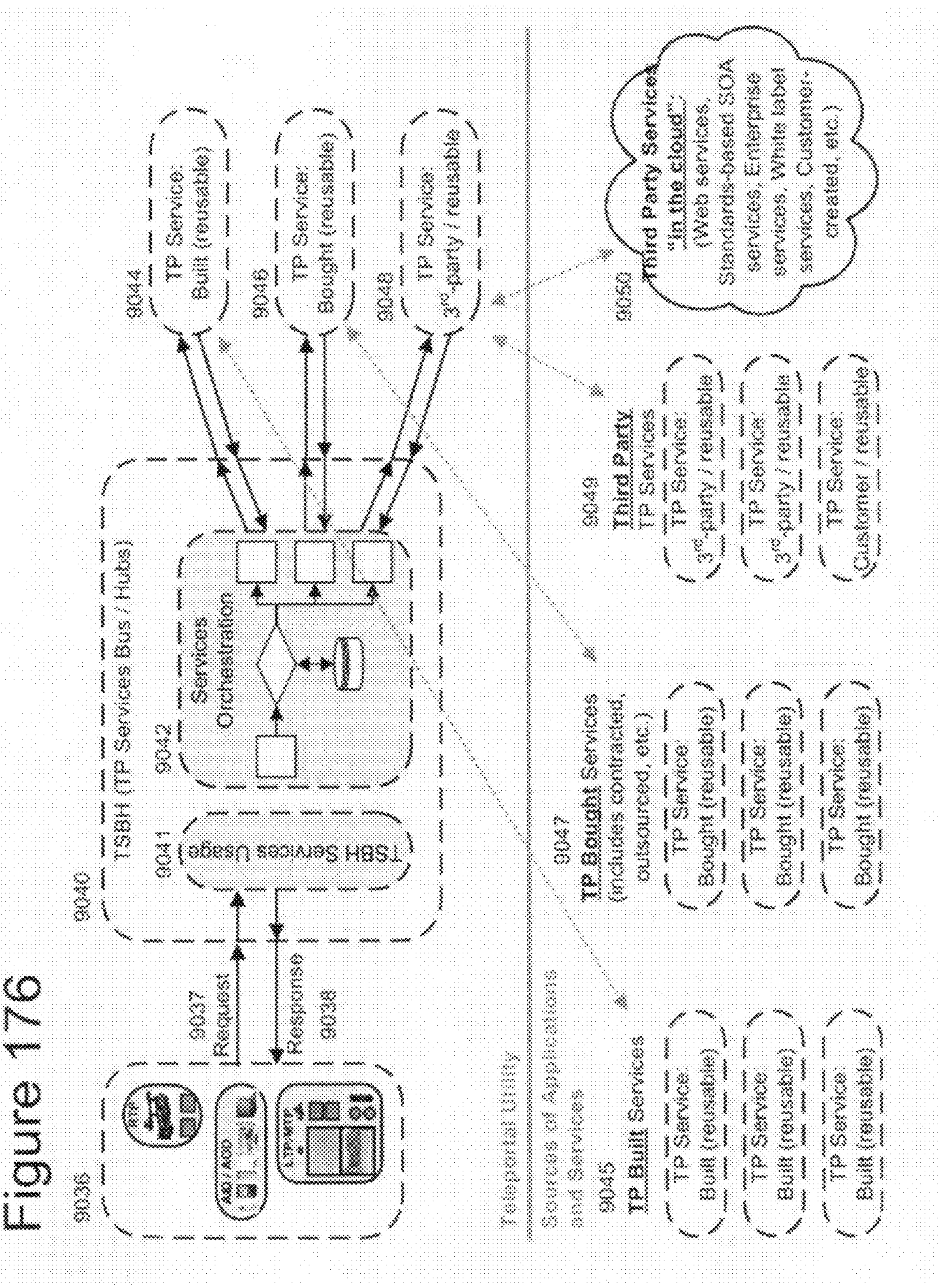

FIG. 176 is a block diagram illustrating some examples of TPU applications services—sources of applications and services.

Figure 177:
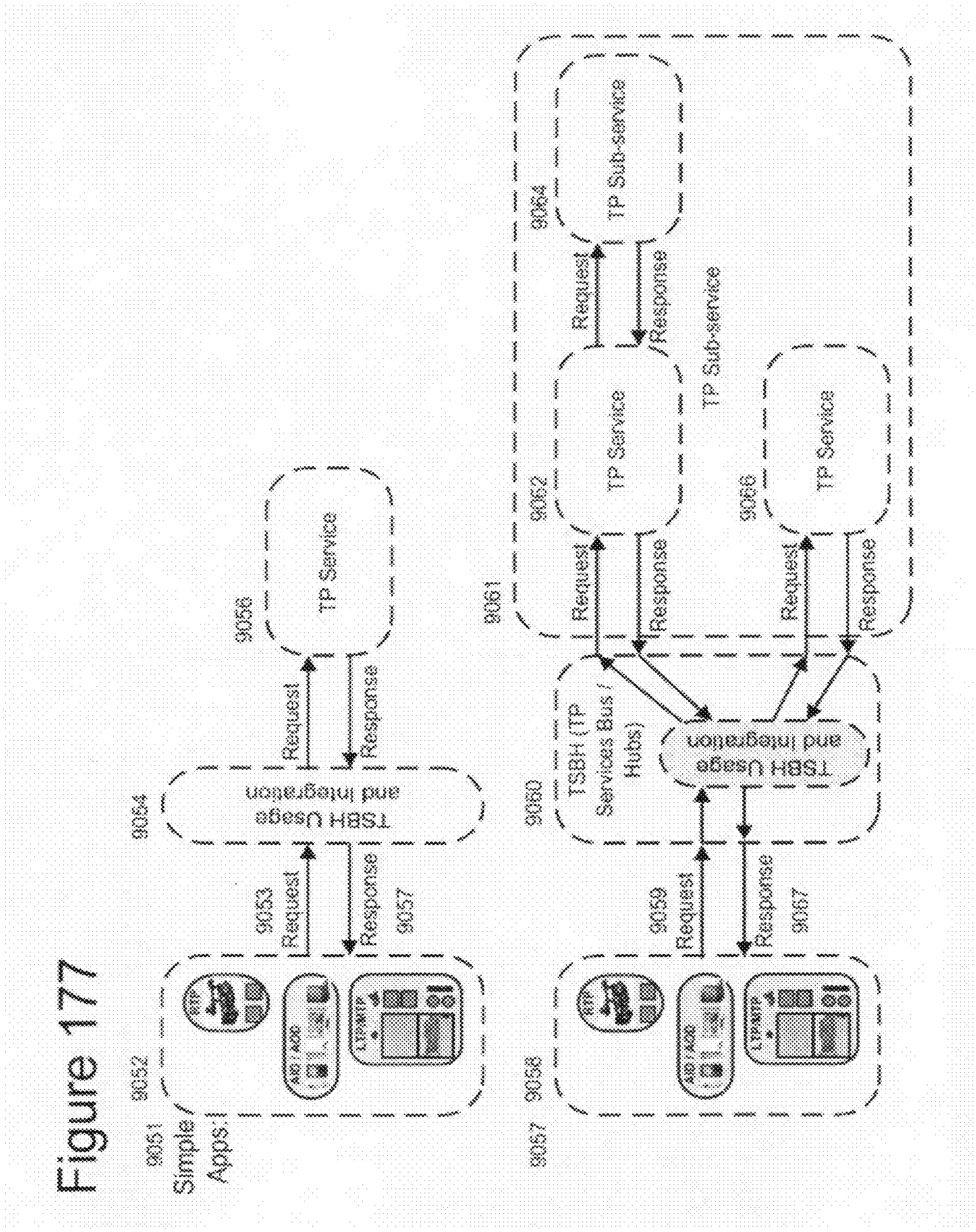

FIG. 177 is a block diagram illustrating some examples of TPU applications services—simple and complex applications.

Figure 178:
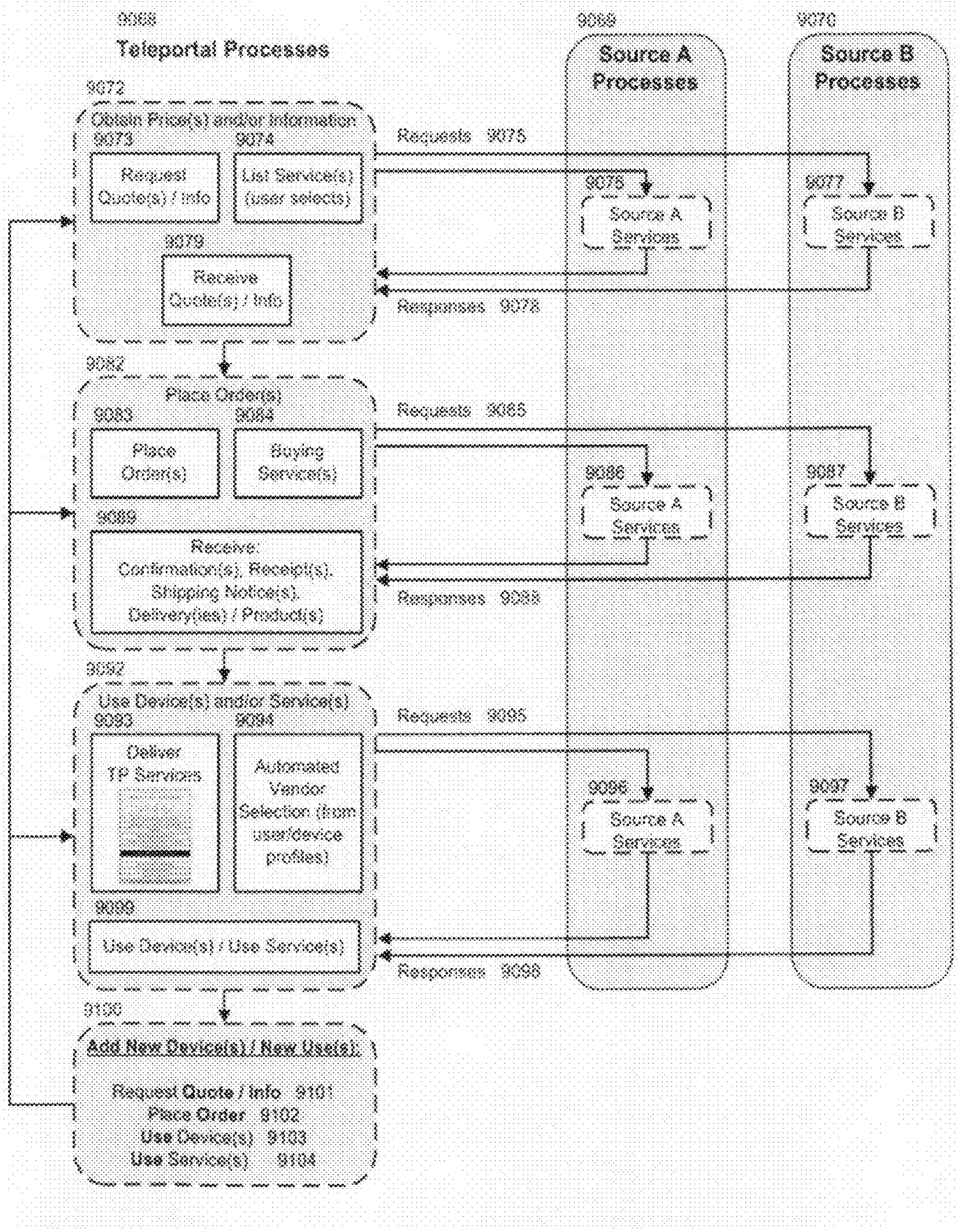

FIG. 178 is a block diagram illustrating some examples of TPU applications services—multiple sources of applications, services and/or processes.

Figure 179:
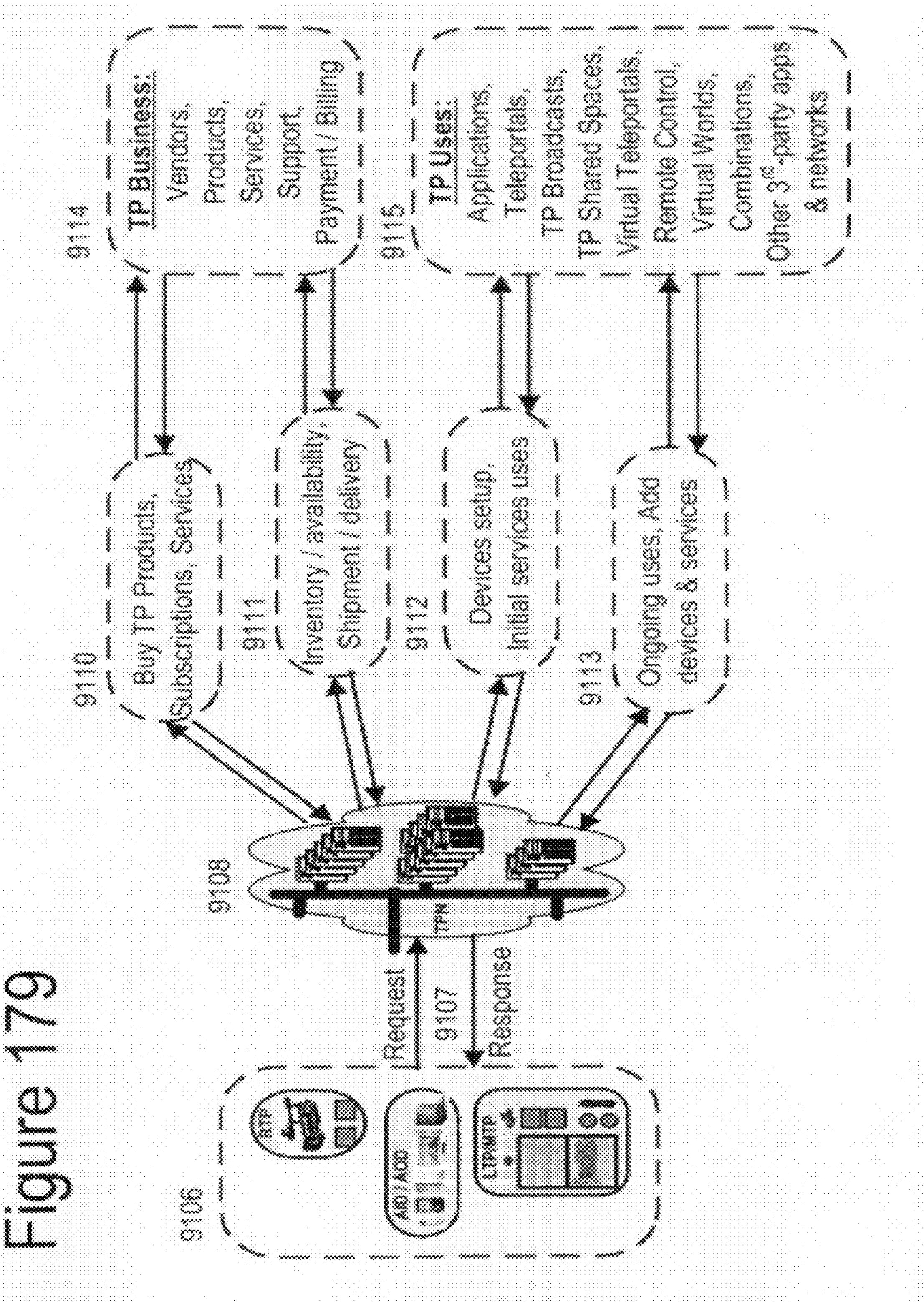

FIG. 179 is a block diagram illustrating some high-level examples of a customer-vendor lifecycle of TPU applications.

Figure 180:
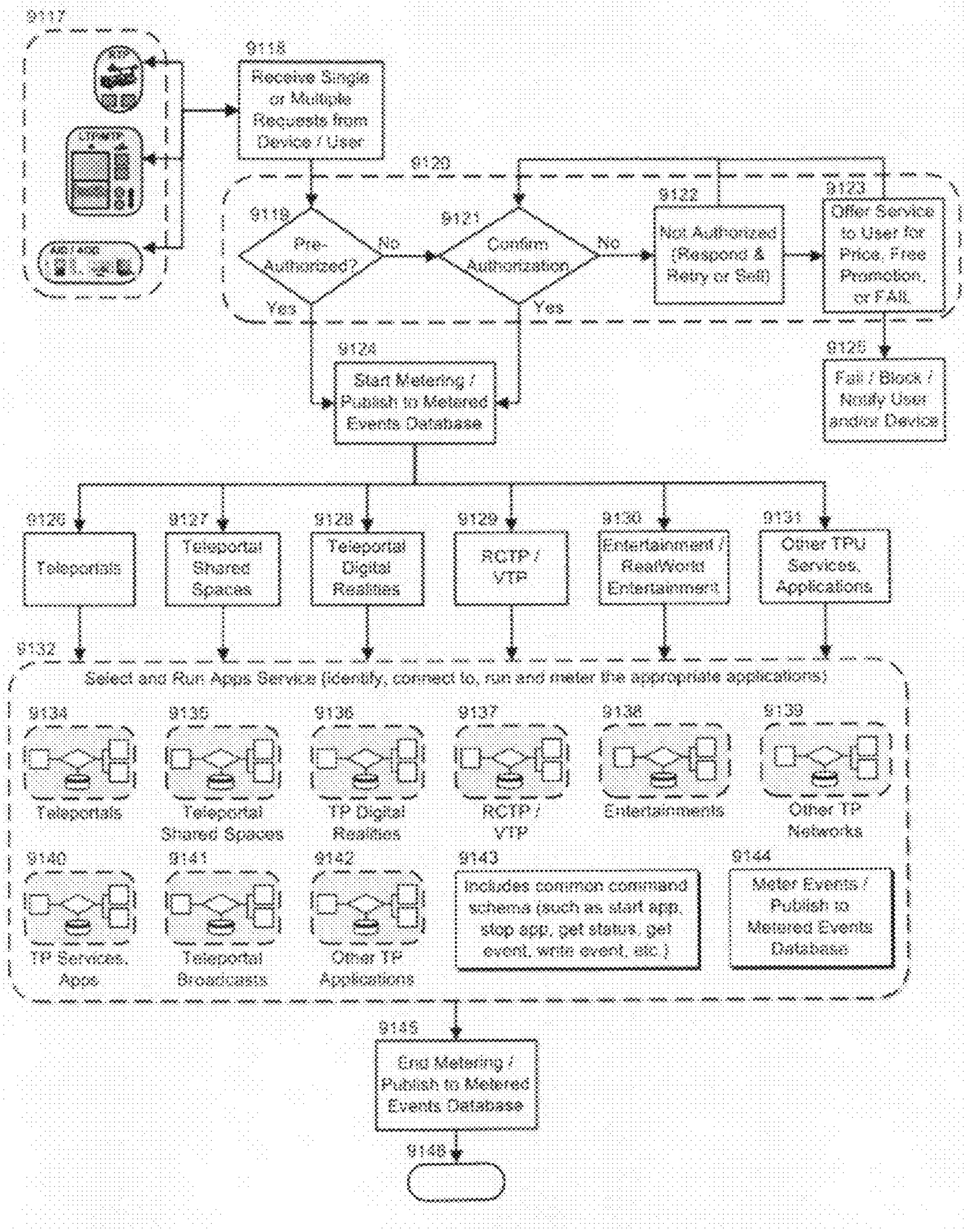

FIG. 180 is a flow chart showing some examples of TPU procedures and processes to run applications.

Figure 181:
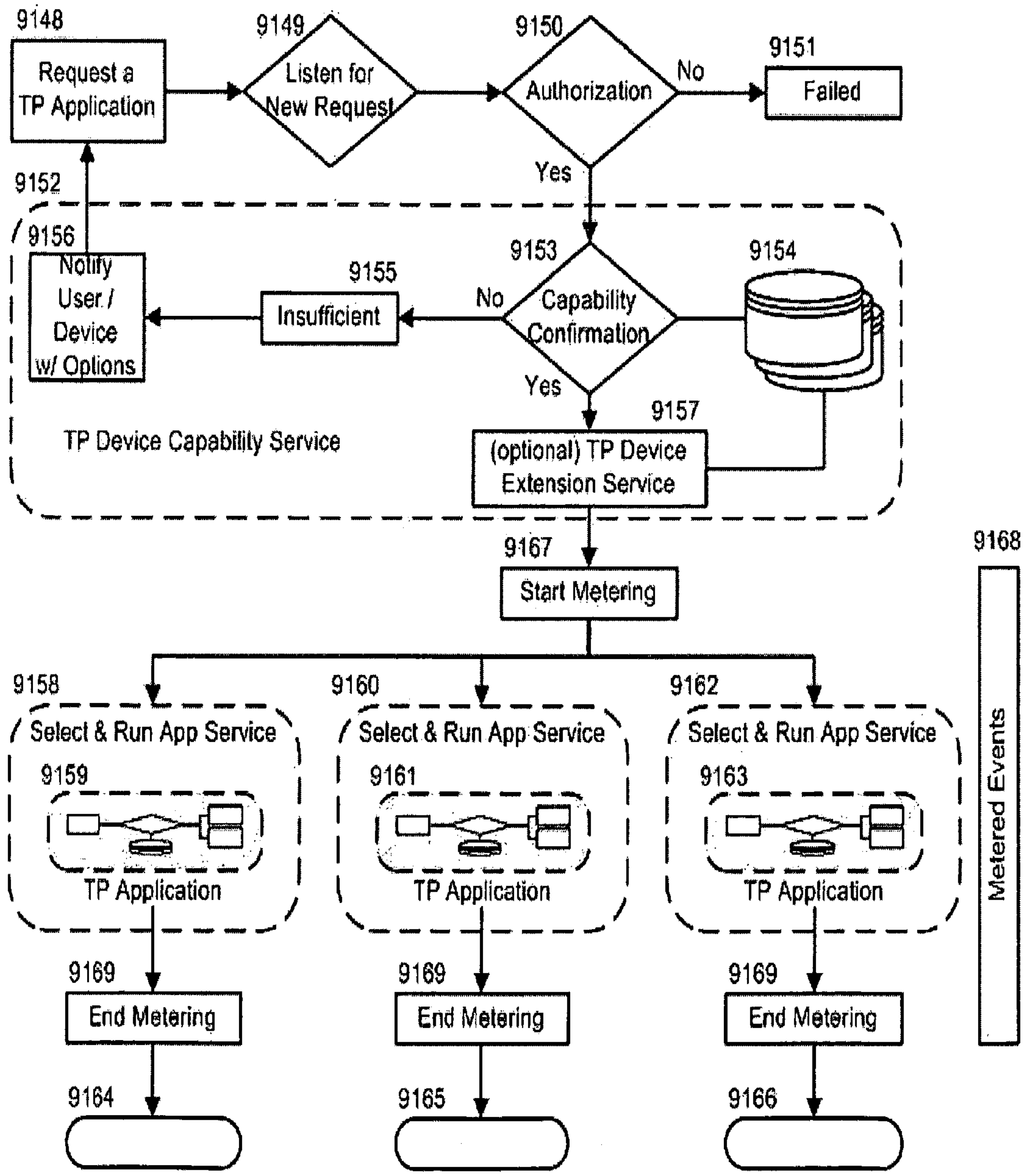

FIG. 181 is a flow chart showing some examples of TPU processes to run applications including device capability confirmation, and metering events.

Figure 182:
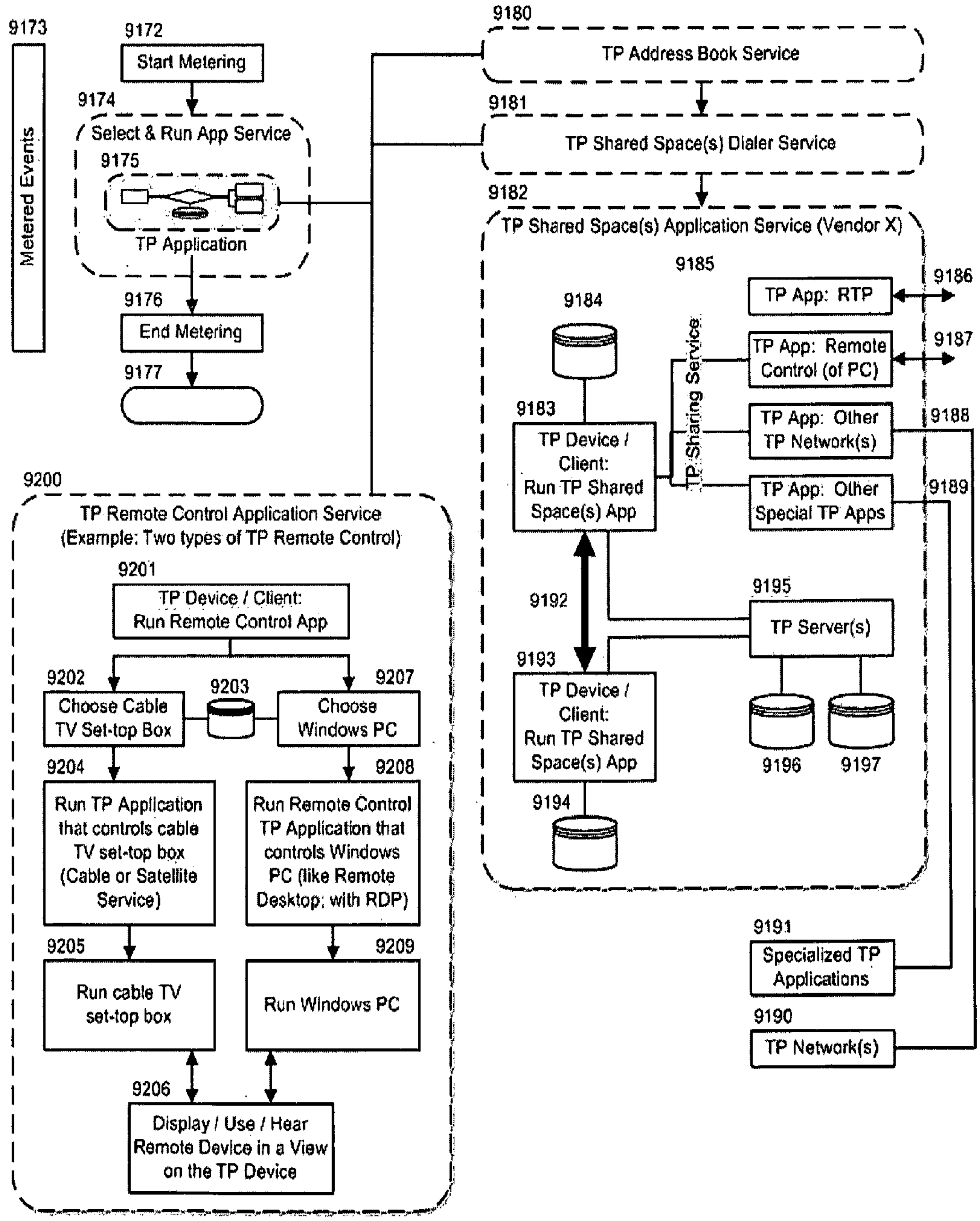

FIG. 182 is a flow chart showing some examples of procedures for selecting and running TPU applications/application services.

FIG. 183 is a pictorial diagram showing some examples of the reality of current interfaces (prior art) compared to some examples of a consistent, adaptable TP interface for digital devices—a user experience transformation from a TP devices architecture.

Figure 184:
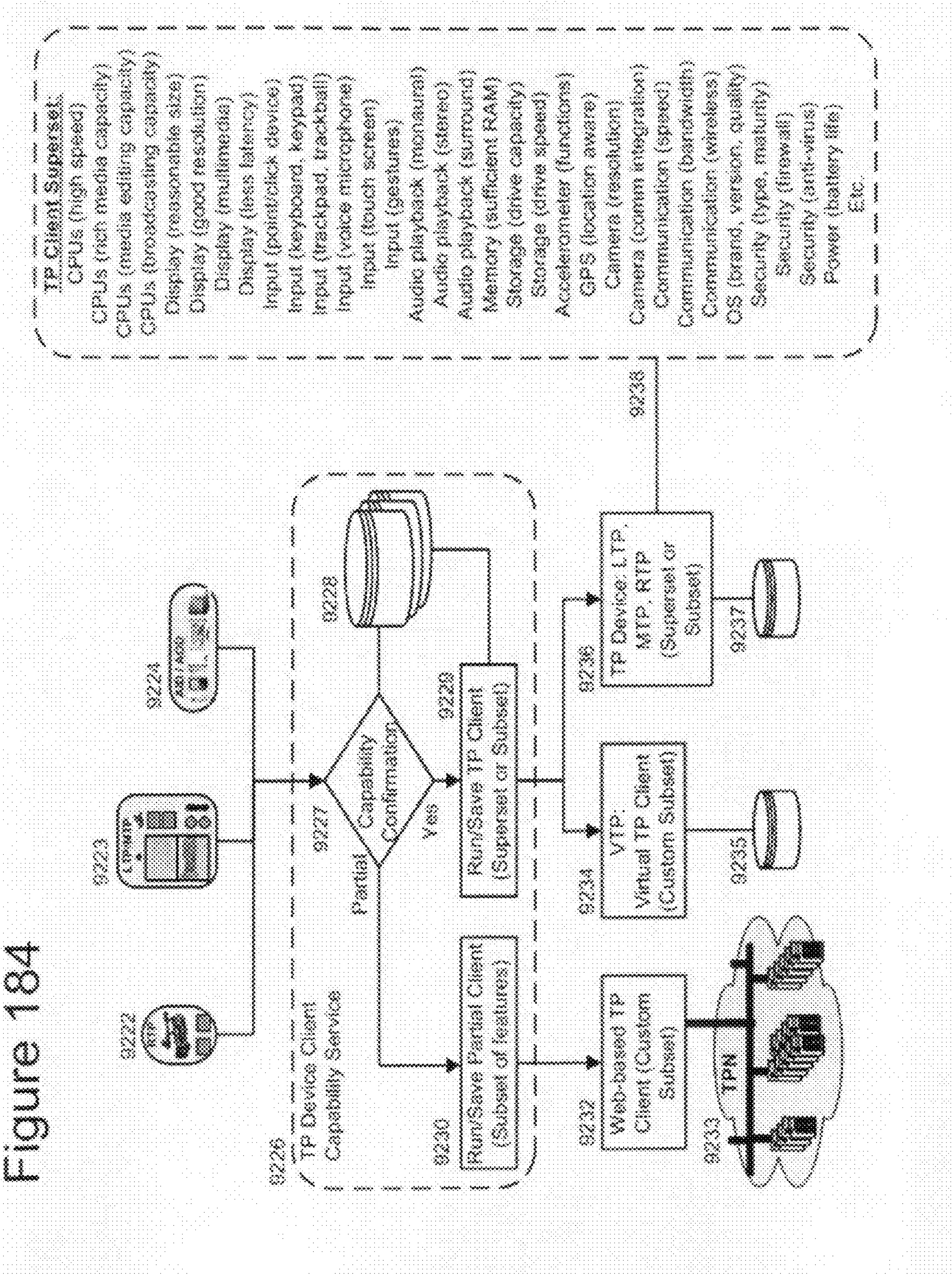

FIG. 184 is a flow chart showing some examples of procedures for a TP devices interface service that adapts to different networked electronic devices.

Figure 185:
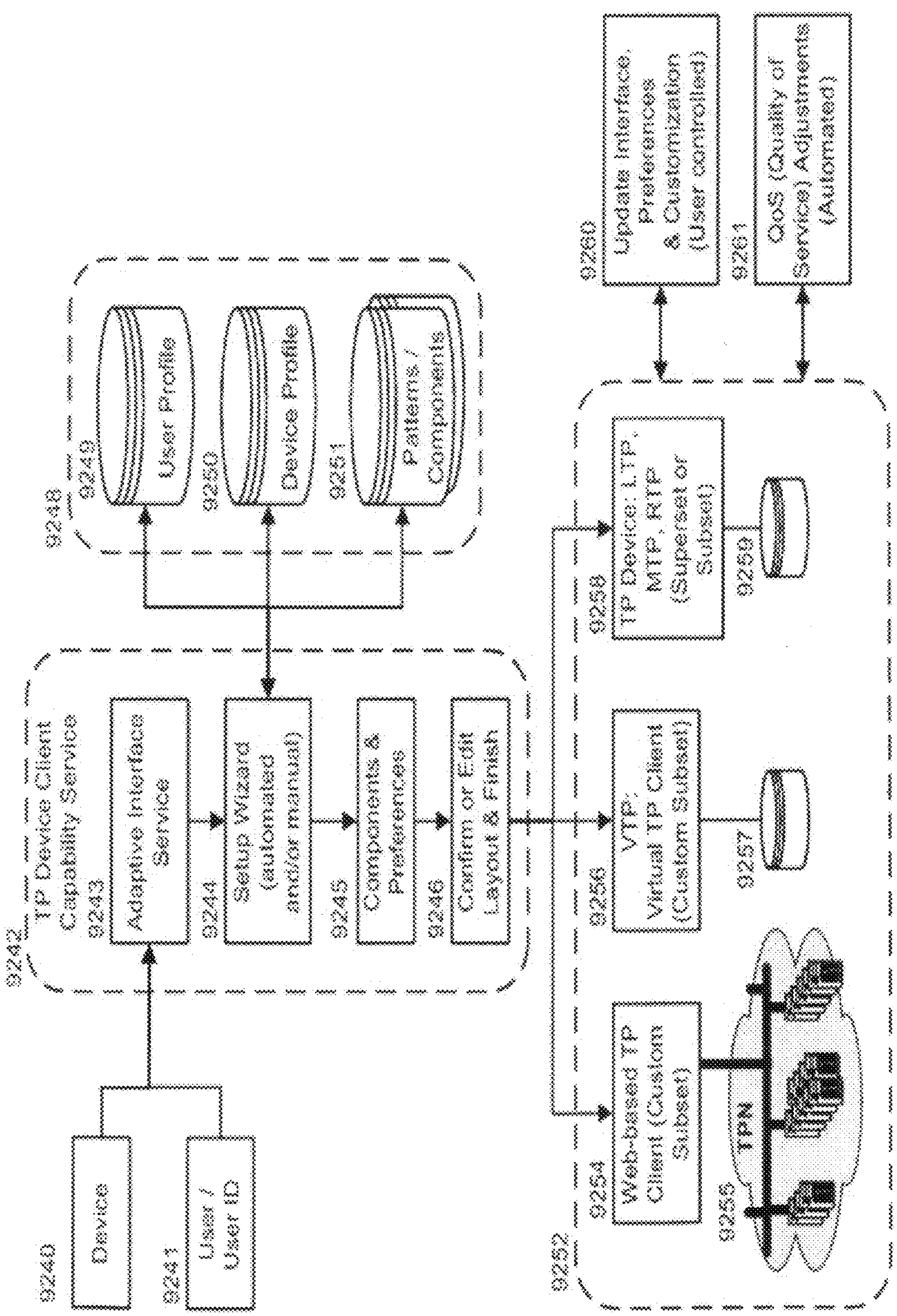

FIG. 185 is a flow chart showing some examples of procedures for an adaptive user interface.

Figure 186:
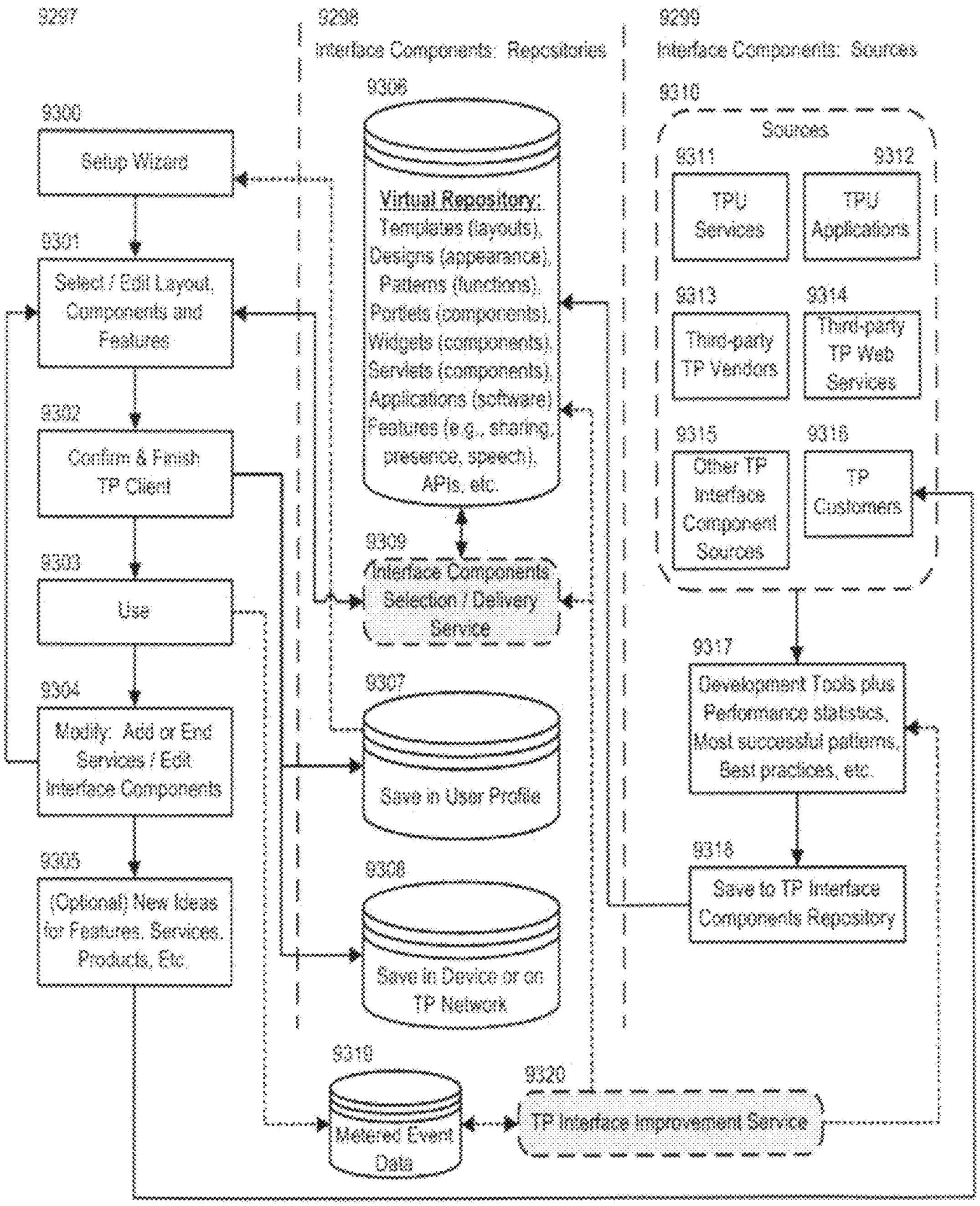

FIG. 186 is a block diagram showing some examples of adaptive interface components processes that include interface design, use, delivery, sources, repository(ies), metering and improvements.

Figure 187:
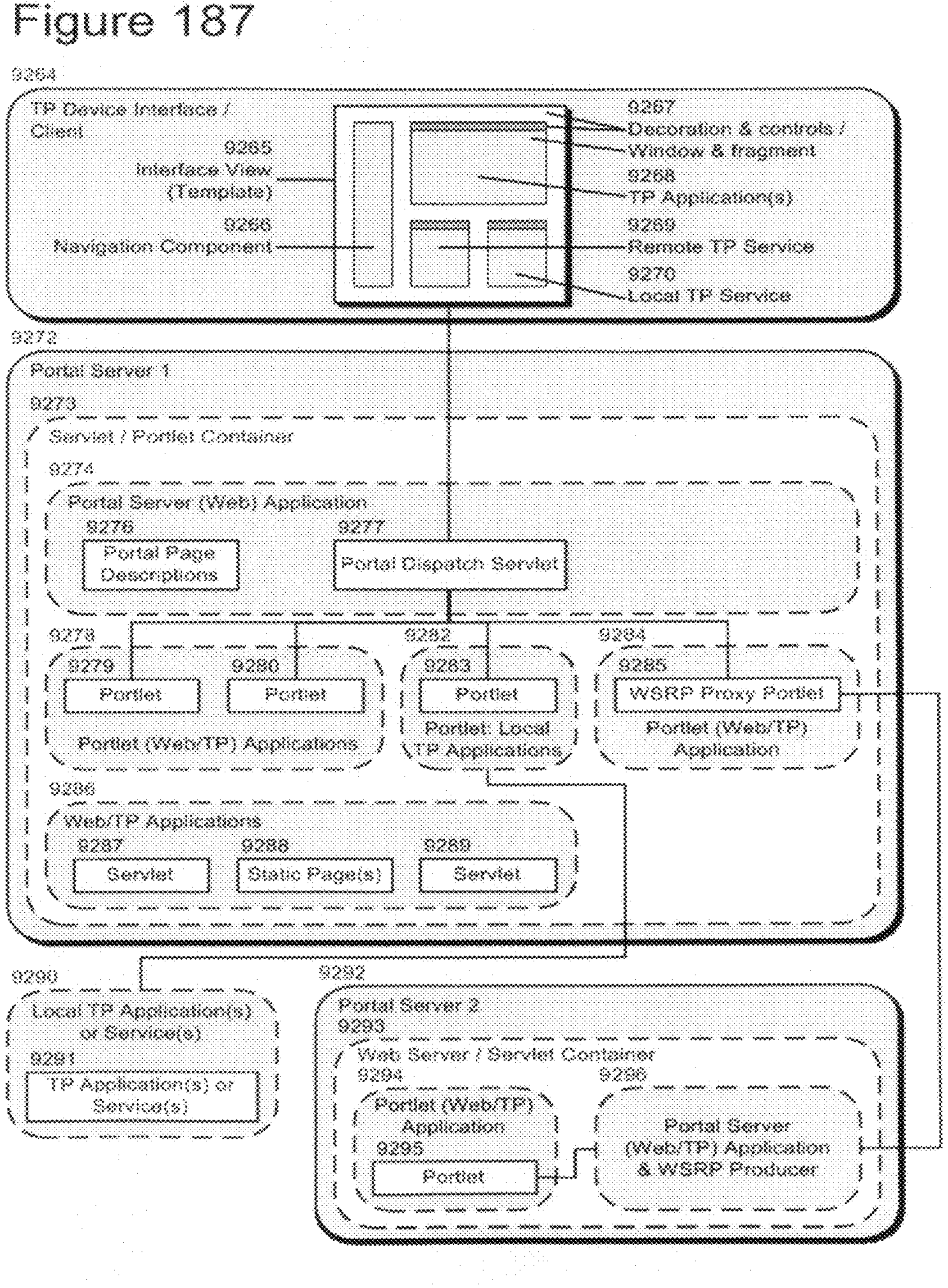

FIG. 187 is a block diagram showing some examples of adaptive interface presentation.

Figure 188:
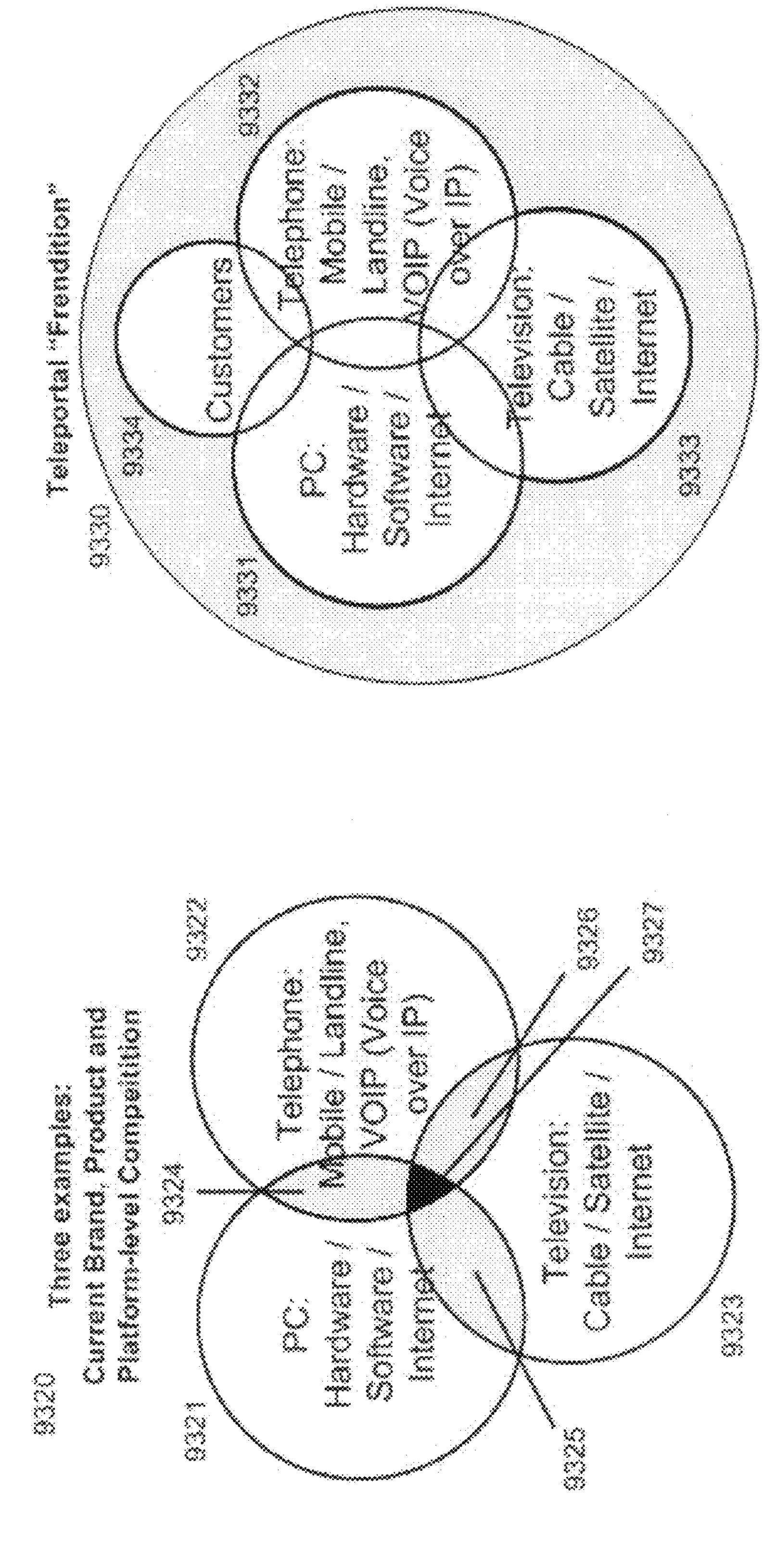

FIG. 188 is a pictorial diagram showing some examples of the difference between current "competition" and pressures for differentiation/incompatibility (prior art) compared to TPU "frendition" of competition with an evolving framework/platform.

Figure 189:
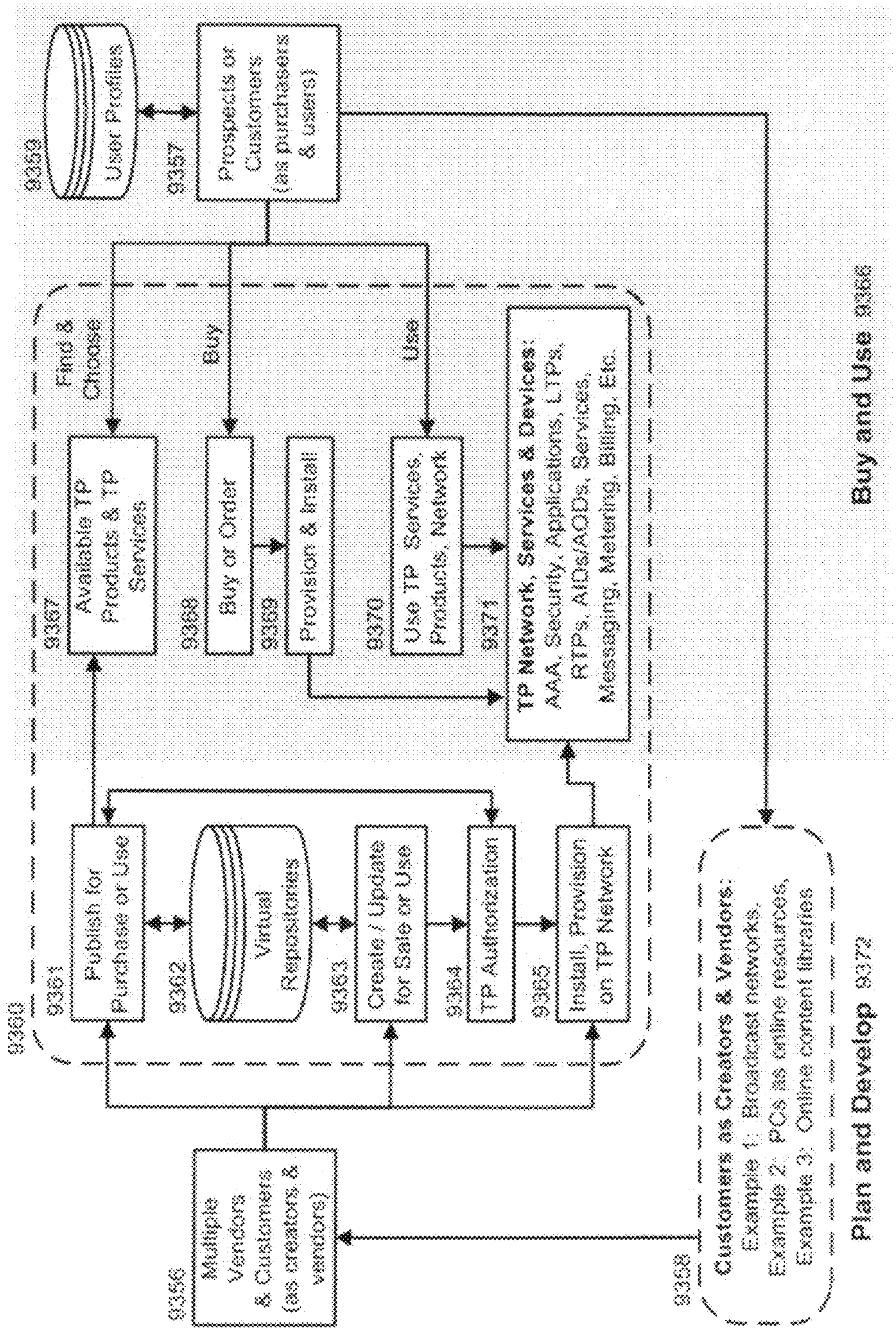

FIG. 189 is a block diagram showing some examples of ecosystem processes that align buying and using with planning, developing and selling.

Figure 190:
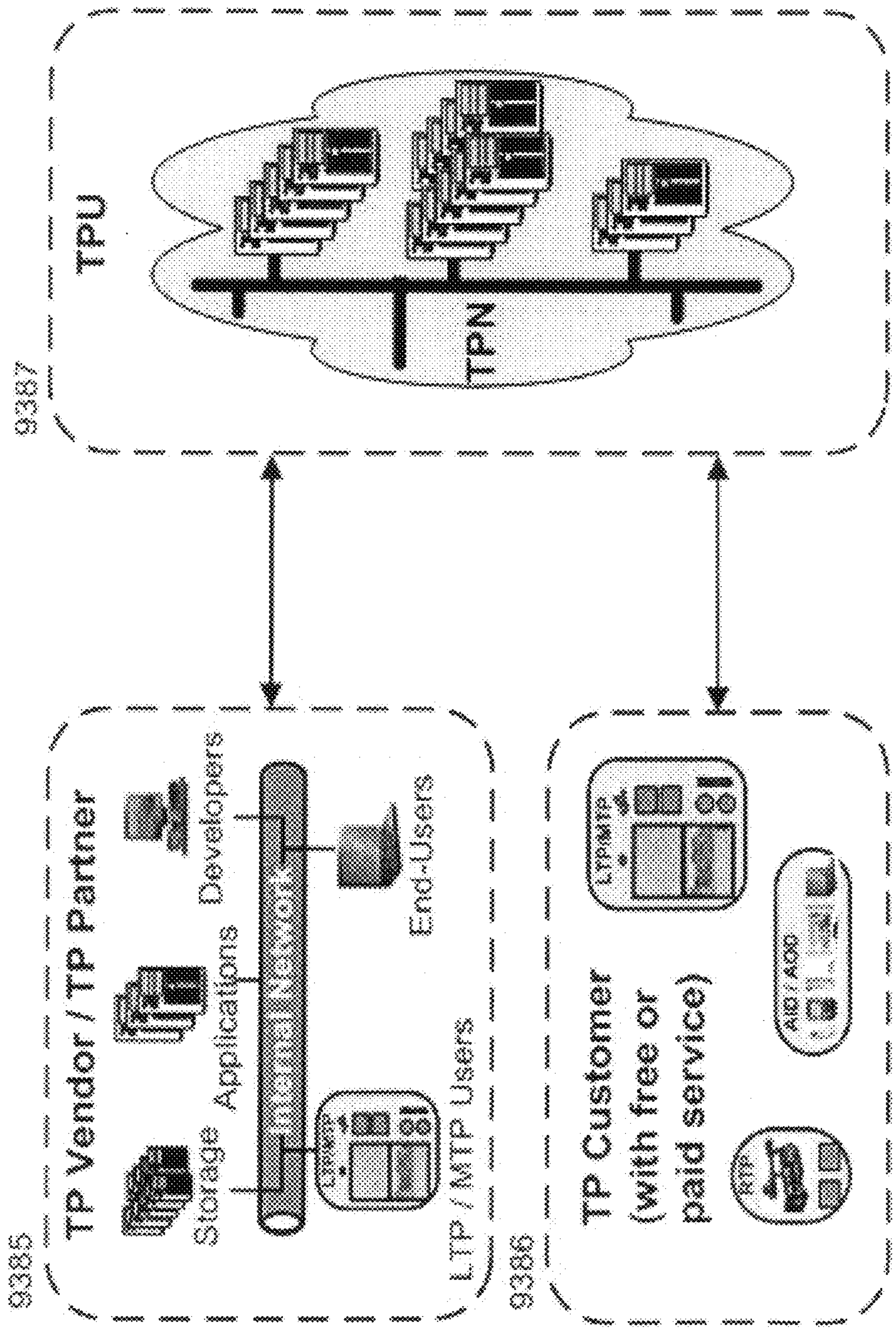

FIG. 190 is a pictorial diagram showing some examples of TPU information exchange.

Figure 191:
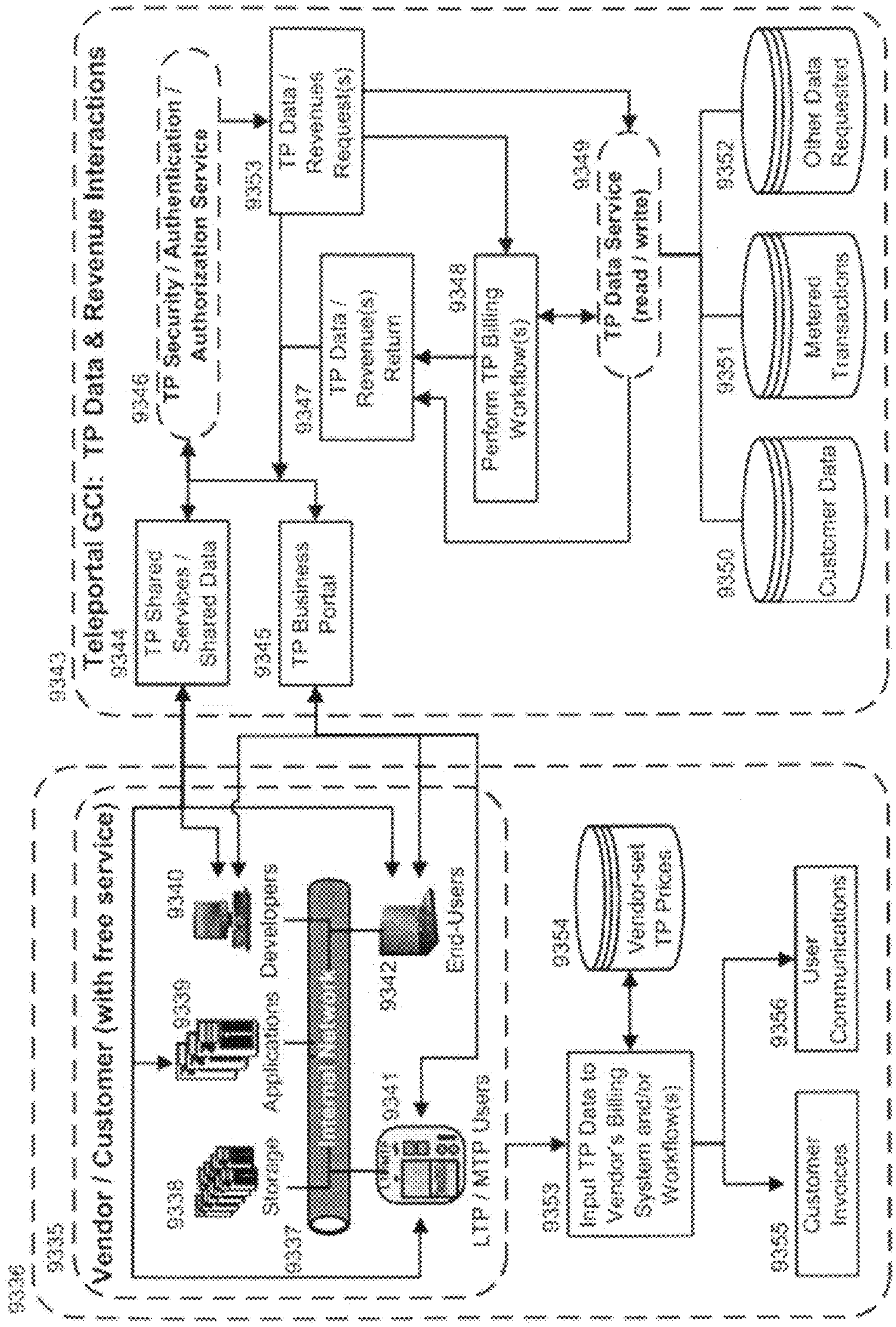

FIG. 191 is a block diagram and flow chart showing some examples of procedures for TPU data and revenue flows.

Figure 192:
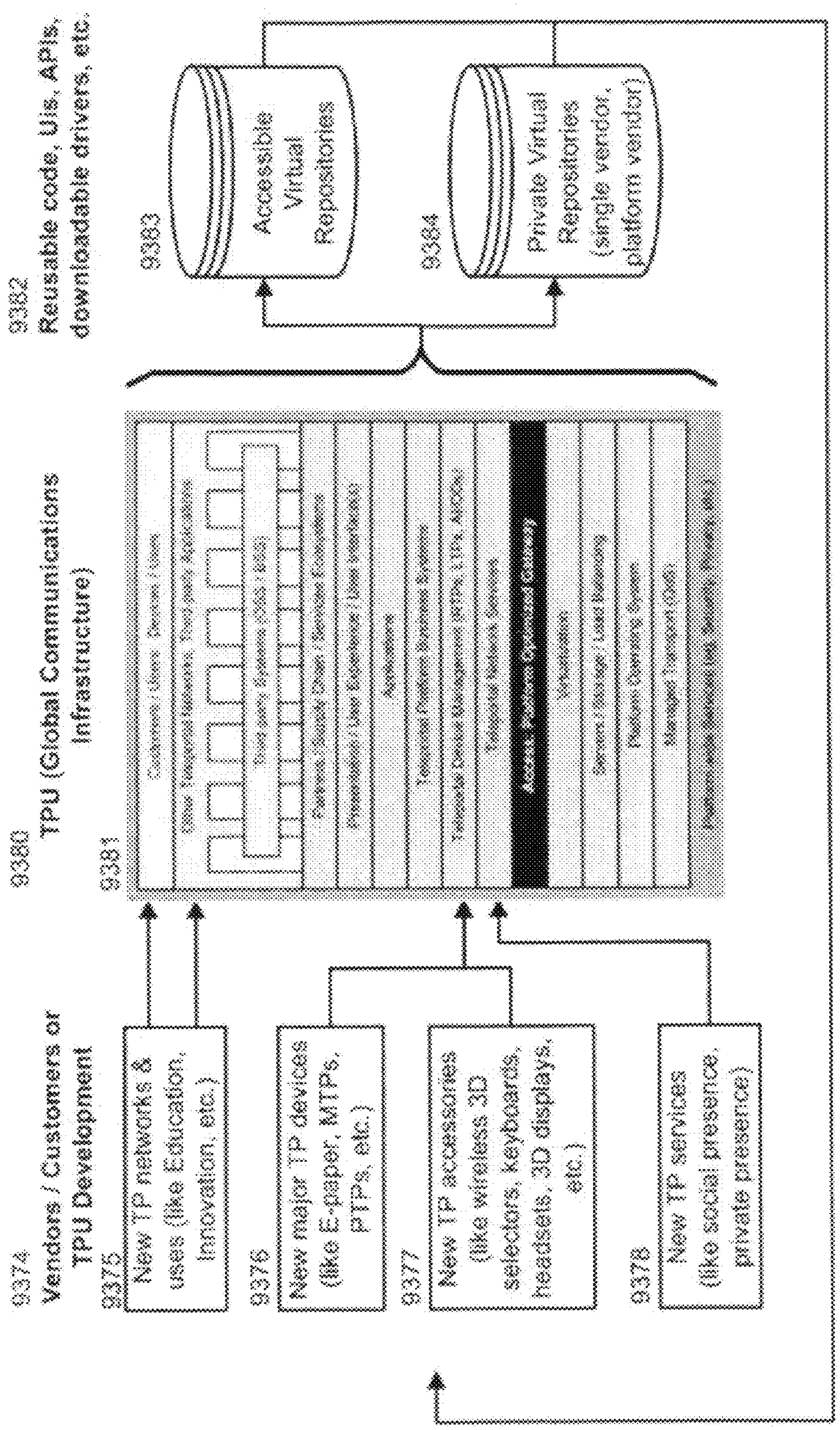

FIG. 192 is a block diagram showing some examples of the TPU infrastructure for new TP innovation (technologies, networks, devices, hardware, services, applications, etc.).

Figure 193:
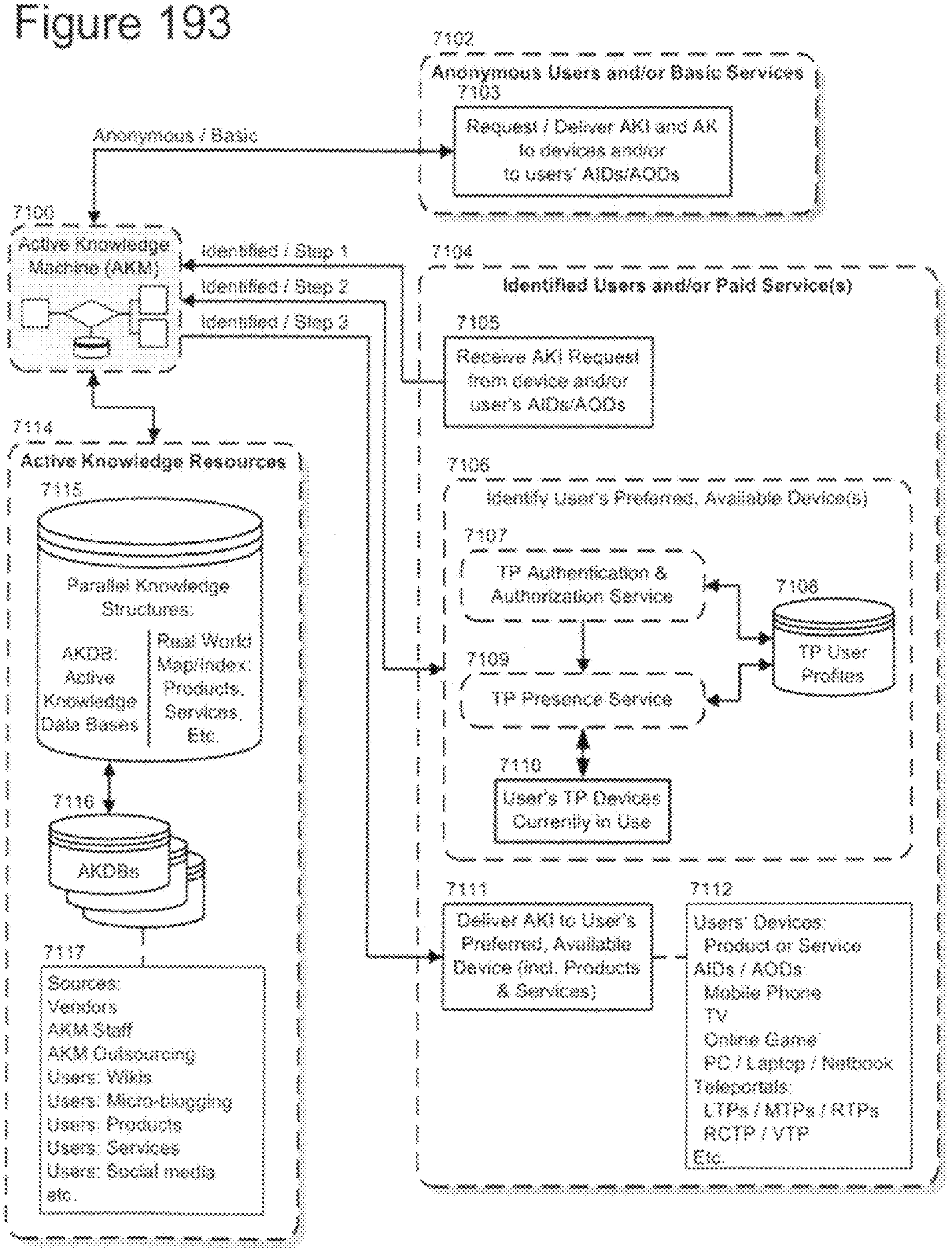

FIG. 193 is a block diagram and flow chart showing some high-level examples of the Active Knowledge Machine (AKM).

Figure 194:
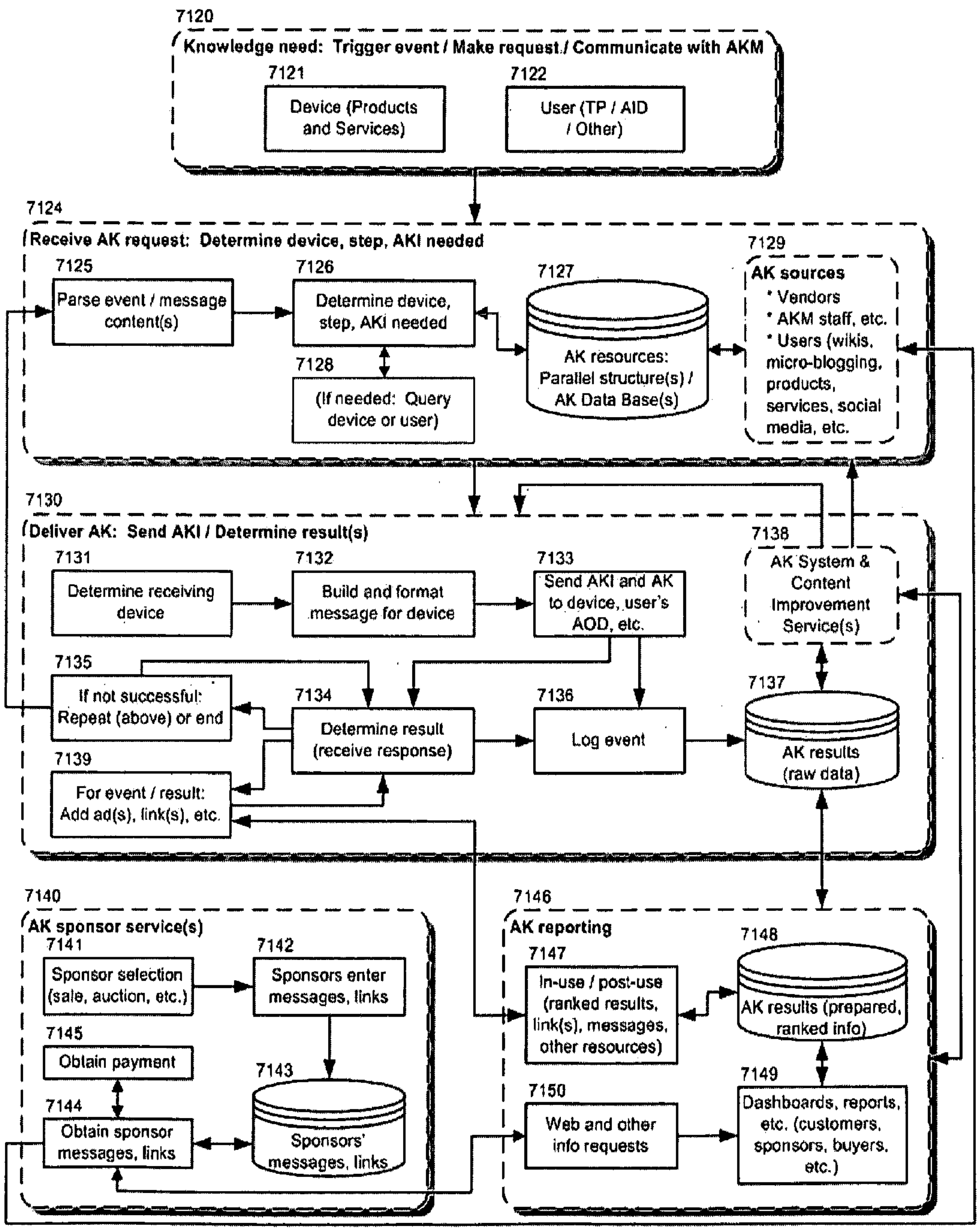

FIG. 194 is a flow chart showing some high-level examples of procedures for Active Knowledge (AK) processes.

Figure 195:
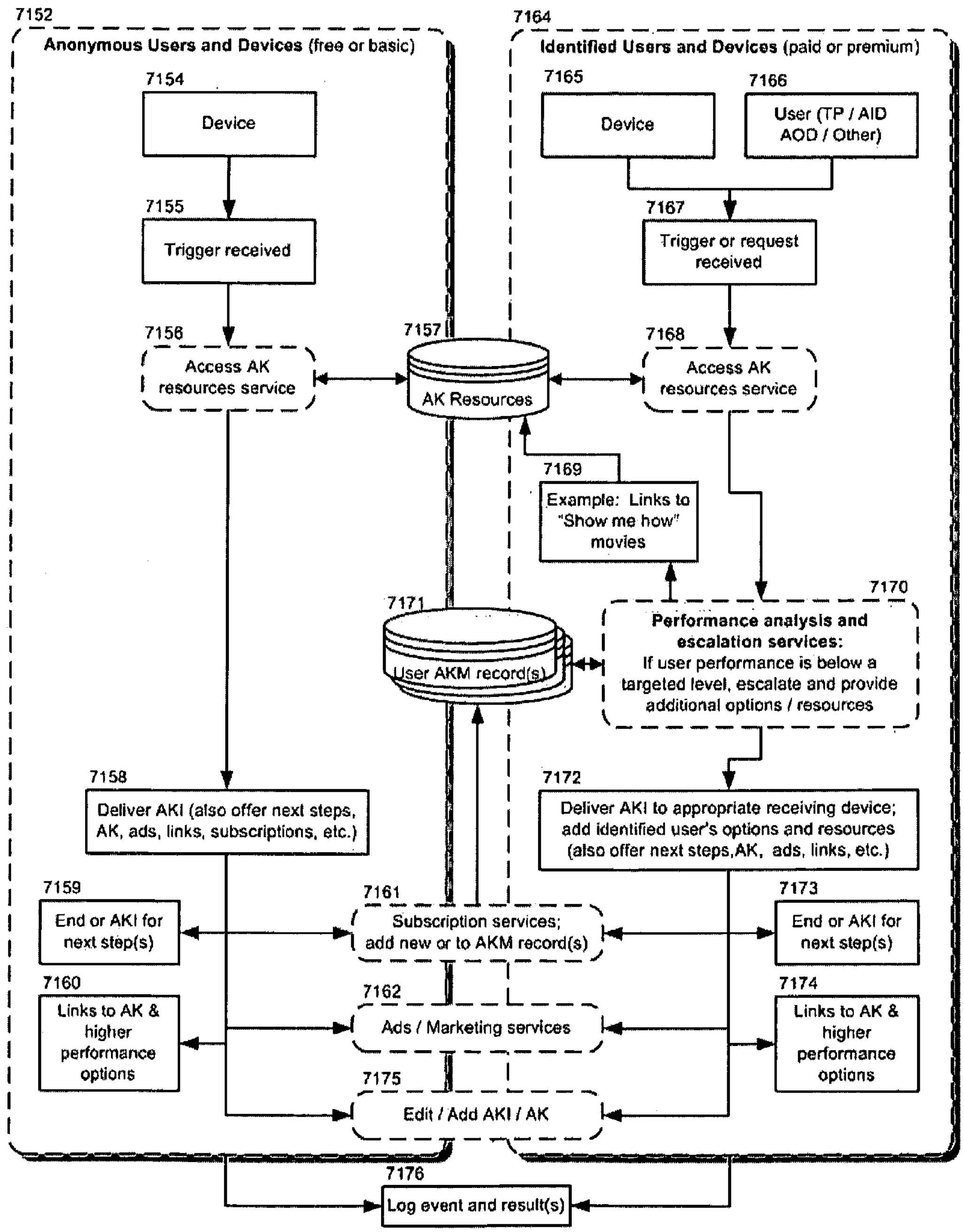

FIG. 195 is a flow chart showing some high-level examples of procedures for AKM and AK interactions.

Figure 196:
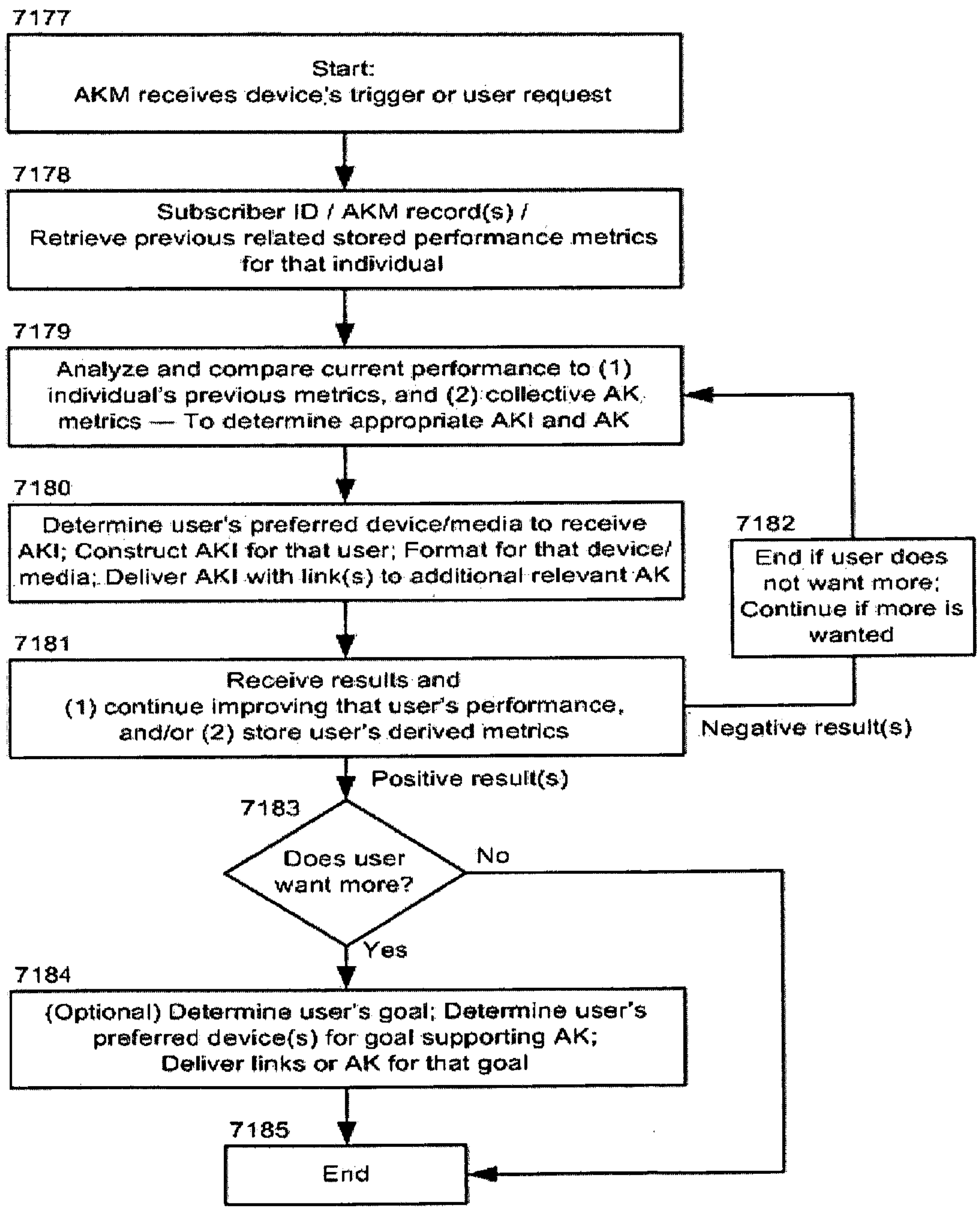

FIG. 196 is a flow chart showing some examples of procedures for active knowledge processes of identified users.

Figure 197:
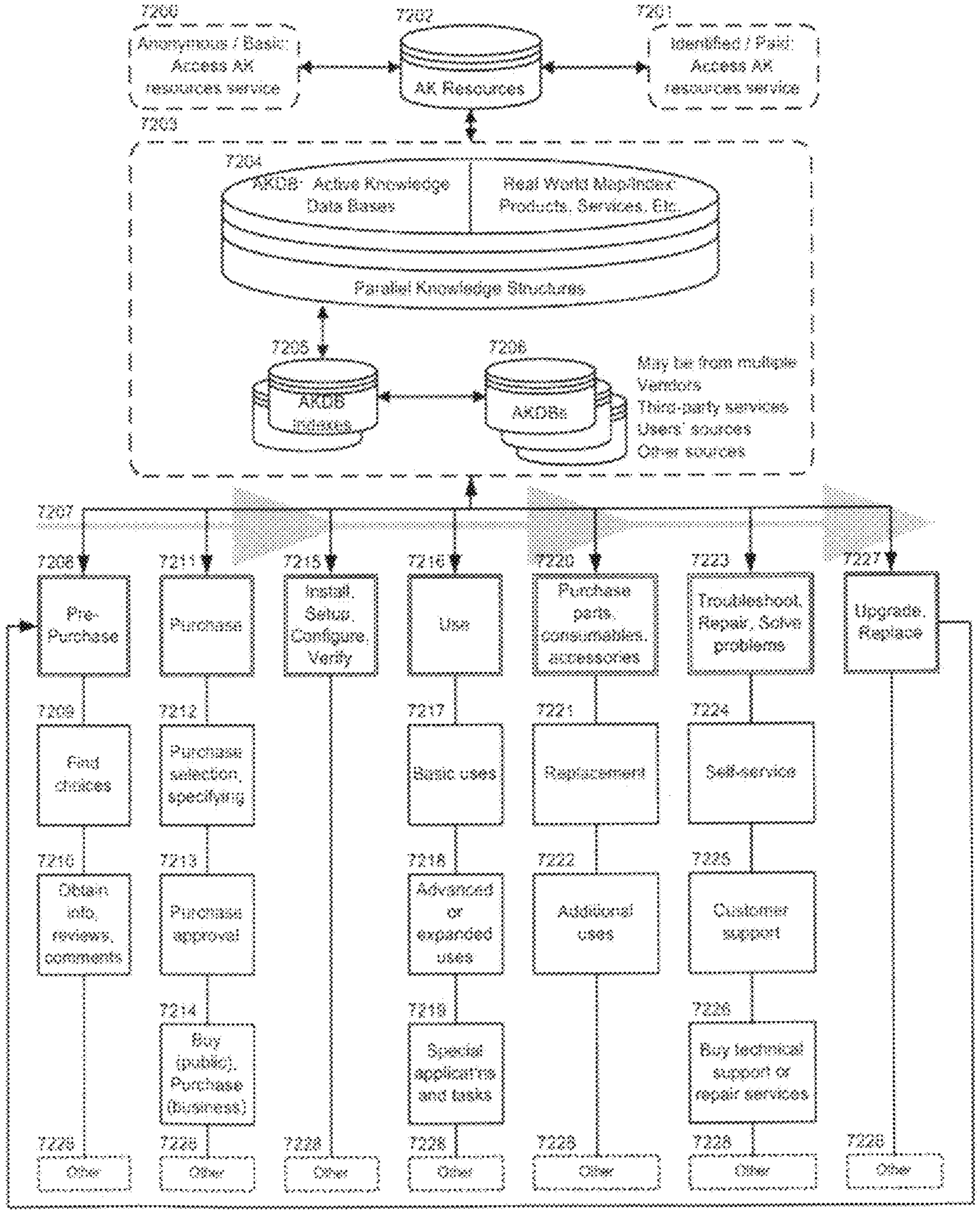

FIG. 197 is a block diagram showing some examples of AKM's parallel doing/storage/access structures.

Figure 198:
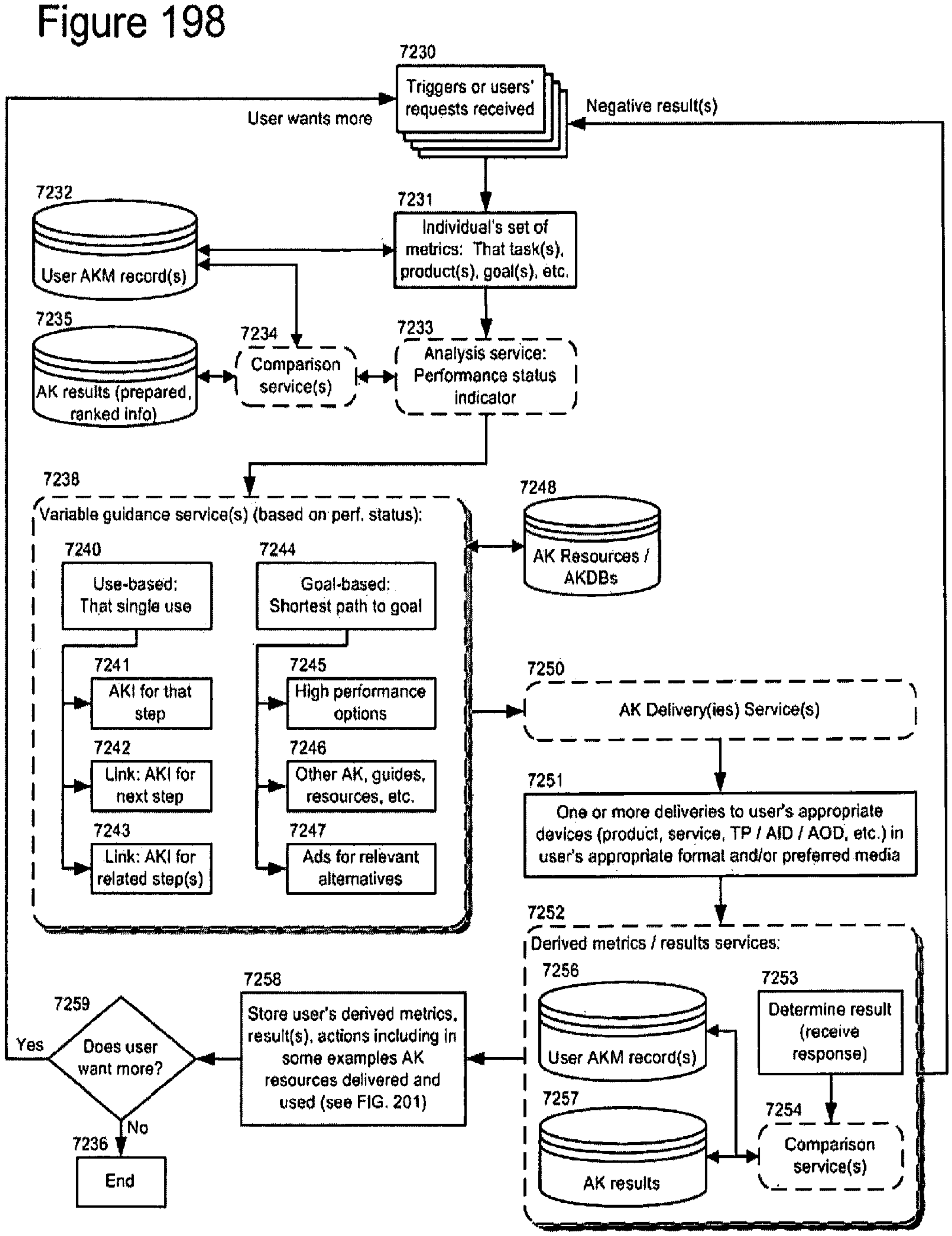

FIG. 198 is a flow chart showing some examples of procedures for AKM performance analysis and escalation.

Figure 199:
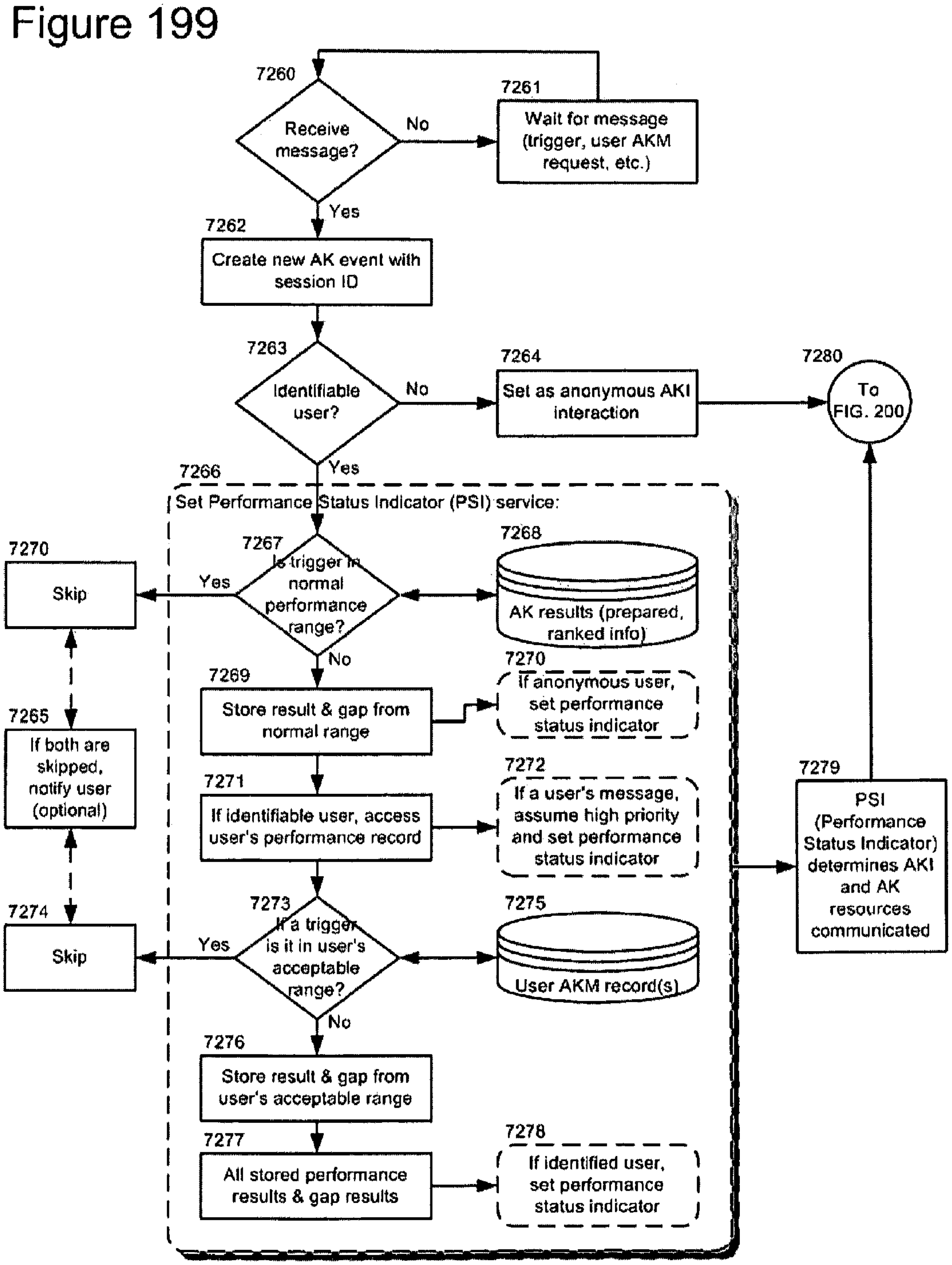

FIG. 199 is a flow chart showing some examples of procedures for AKM analysis and comparisons (trigger-based or user request-based).

Figure 200:
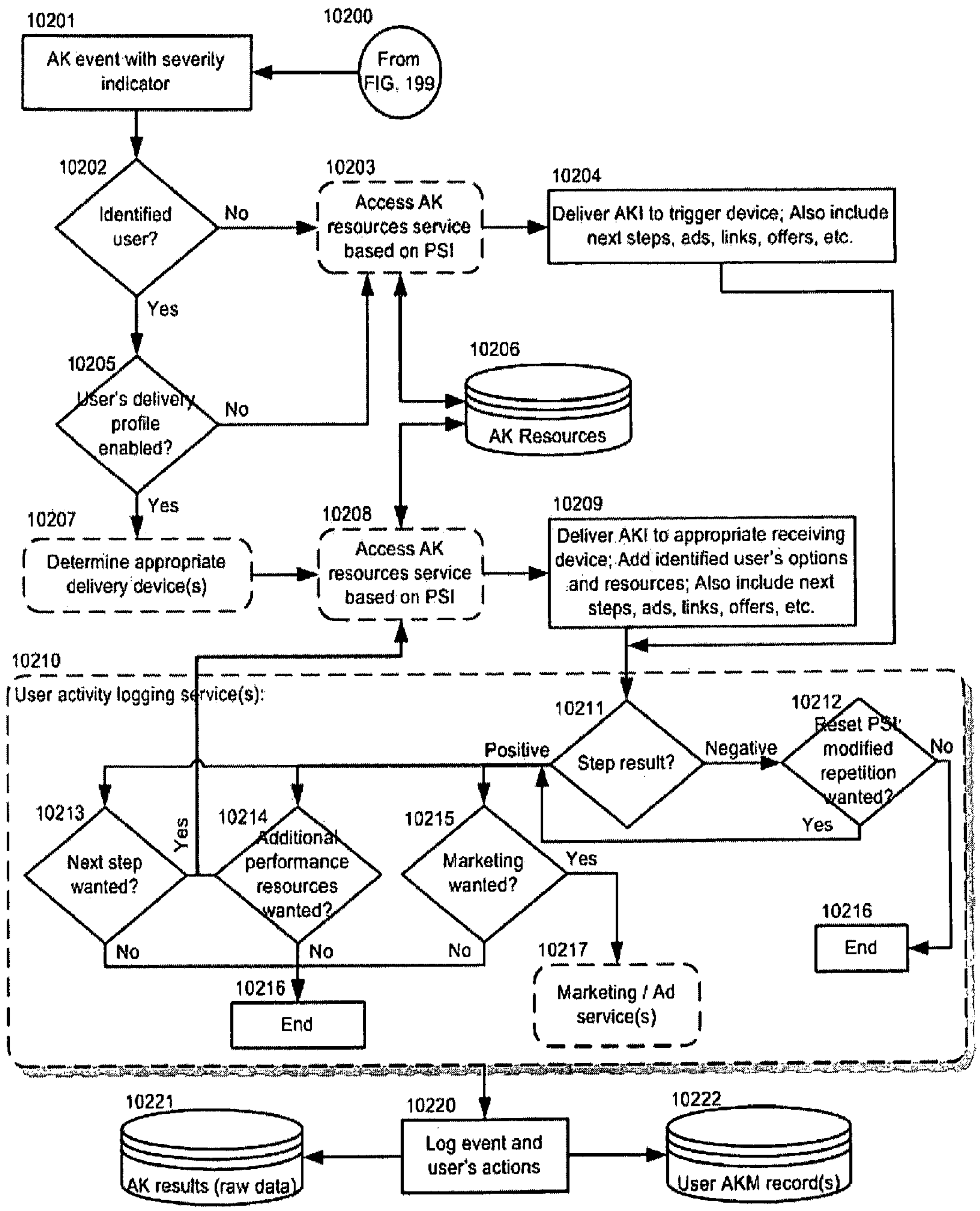

FIG. 200 is a flow chart showing some examples of procedures for AKM user action(s) logging.

Figure 201:
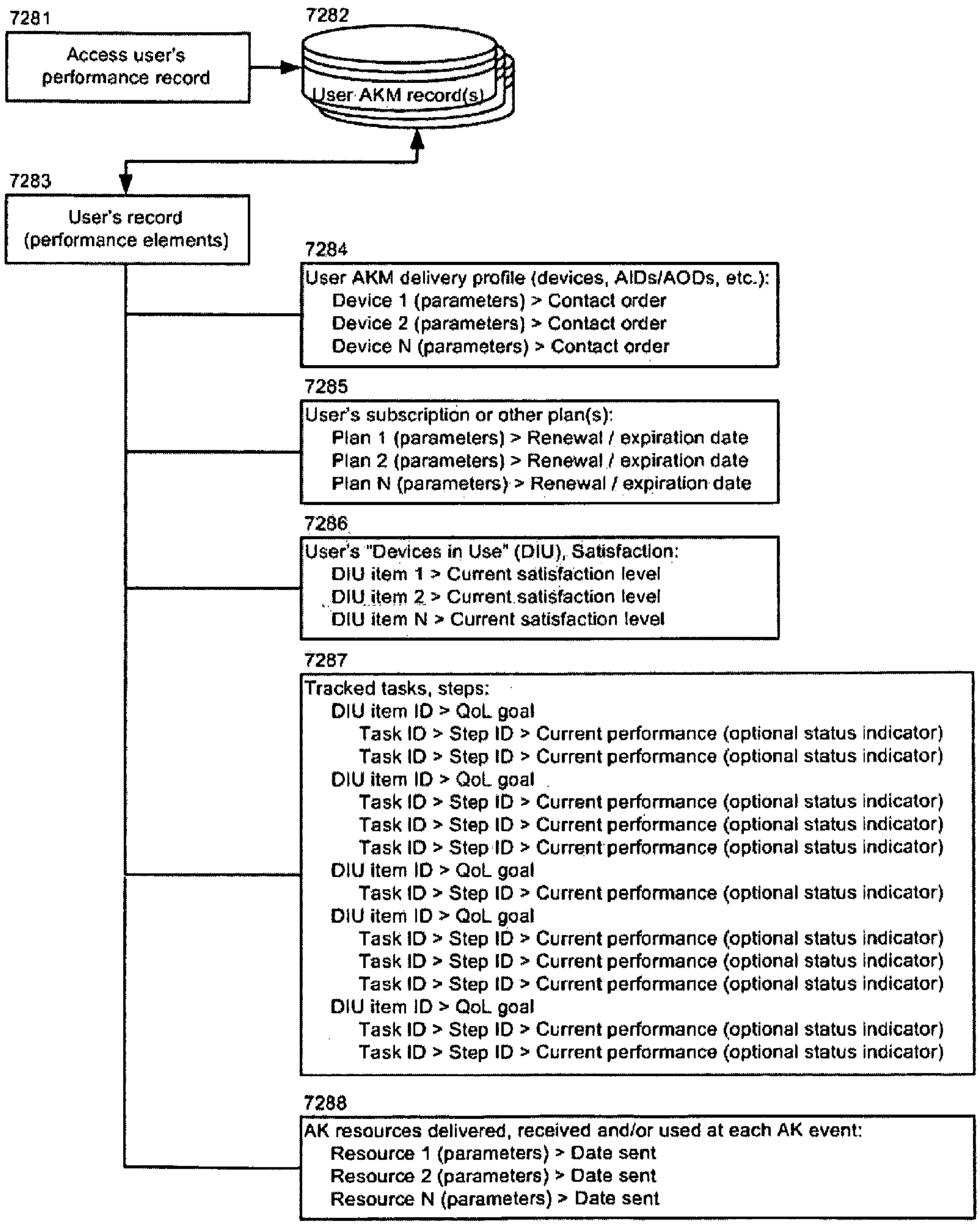

FIG. 201 is a diagram showing some examples of an AKM user performance record.

Figure 202:
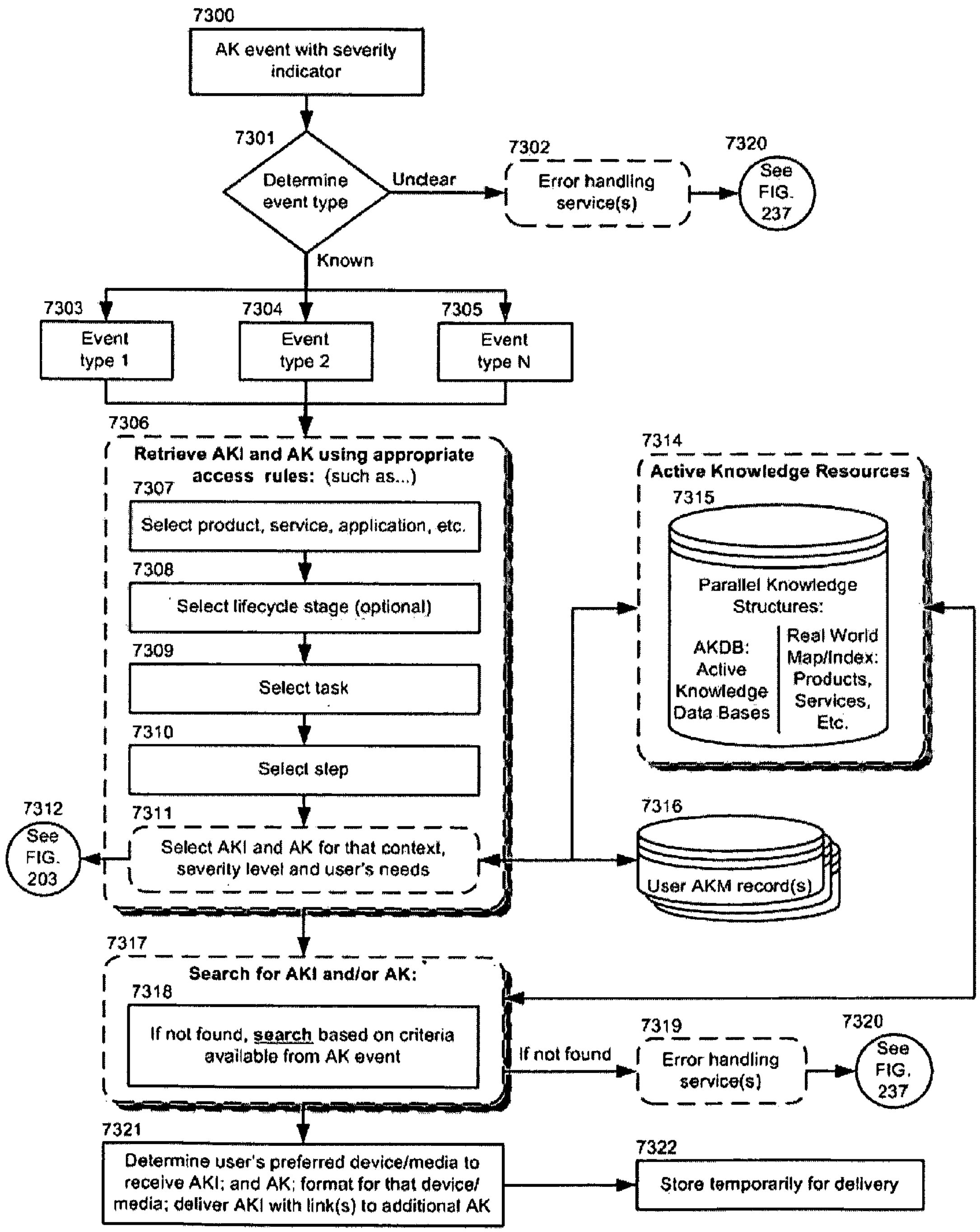

FIG. 202 is a flow chart showing some examples of procedures for AKM access knowledge resources service.

Figure 203:
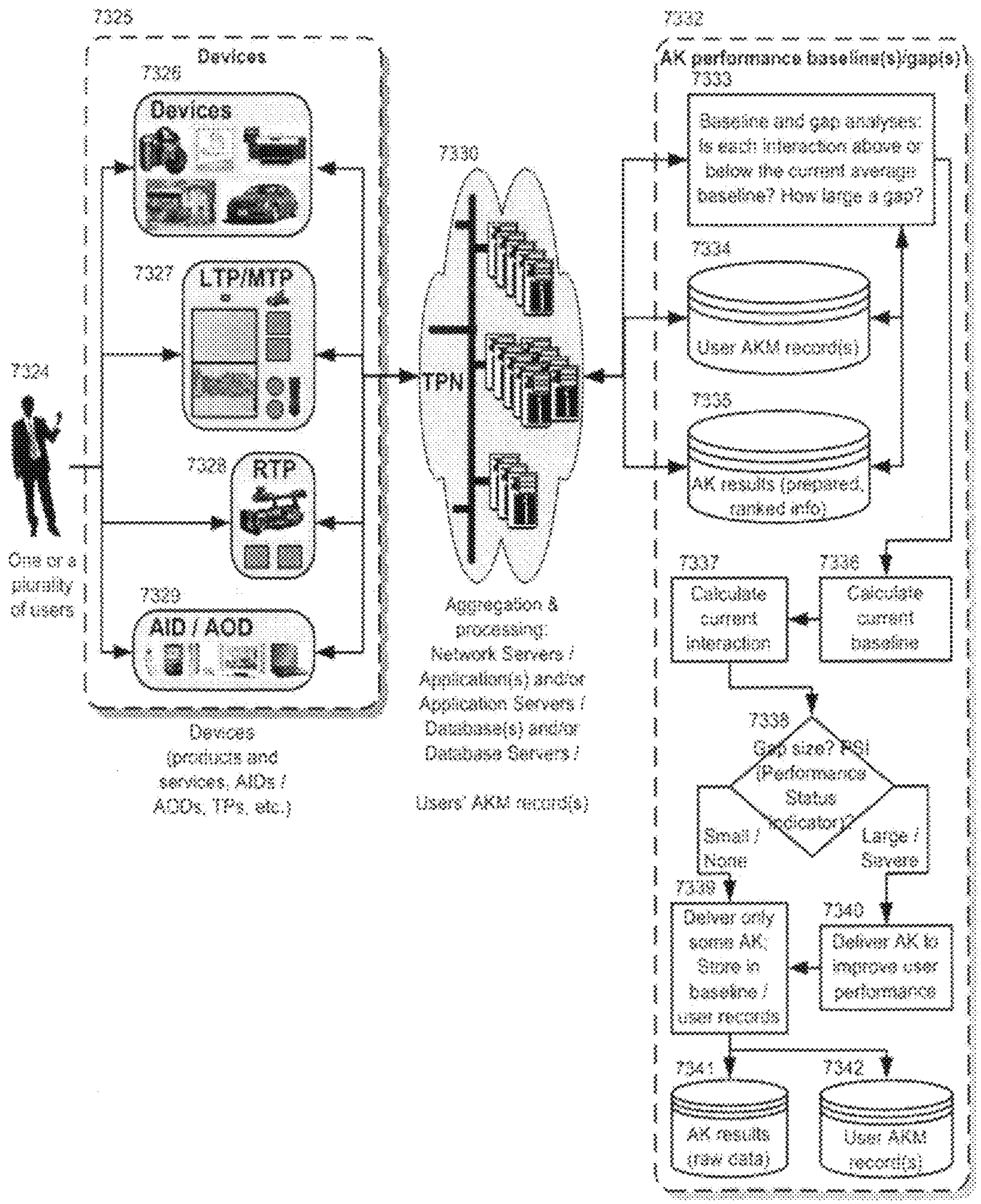

FIG. 203 is a pictorial block diagram and flow chart showing some examples of procedures for determining AK baseline(s) and gap analysis.

Figure 204:
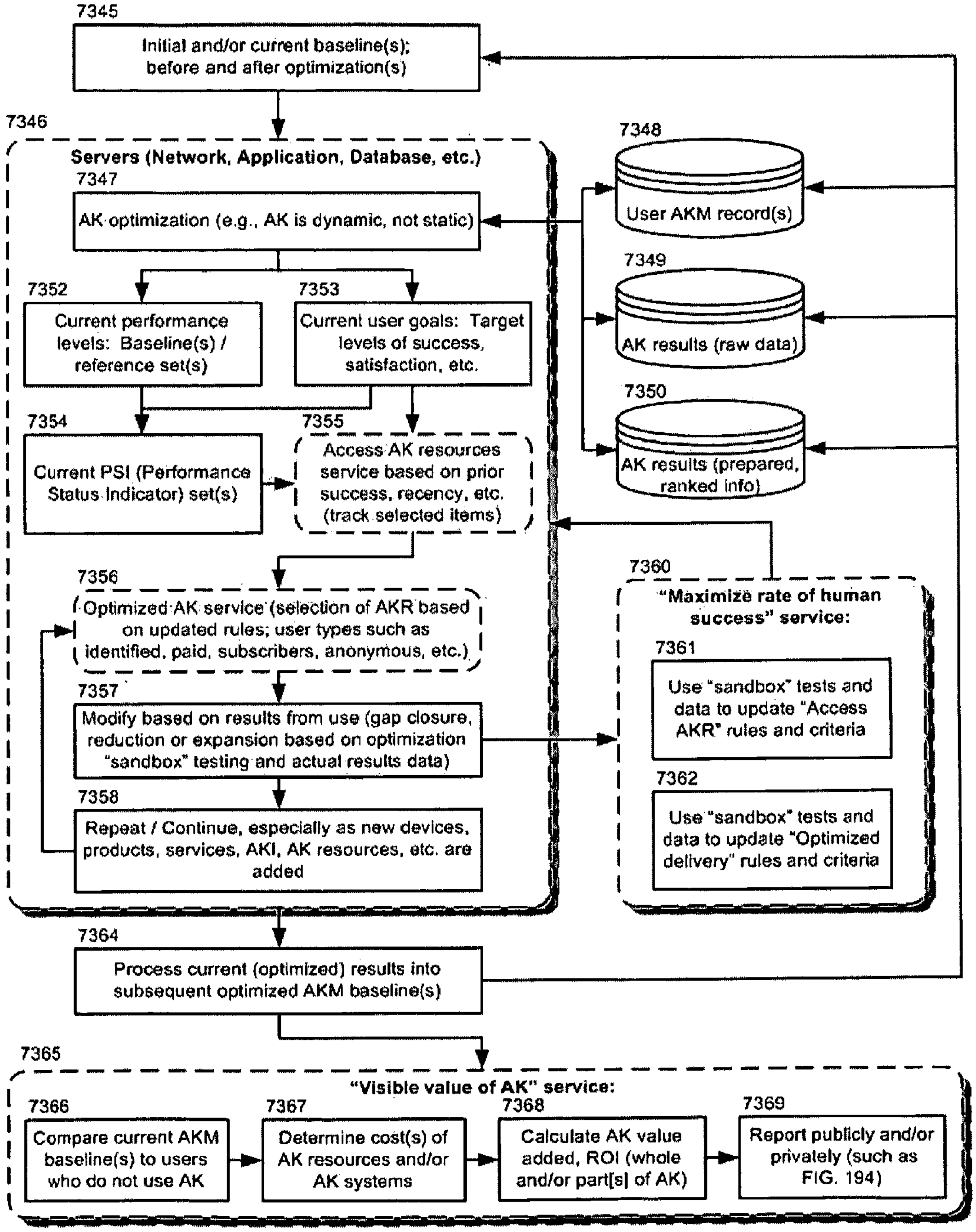

FIG. 204 is a flow chart showing some examples of procedures for optimization to select and deliver best AKI and AK resources, such as in some examples for continuous improvement, and in some examples to make AKM value visible.

Figure 205:
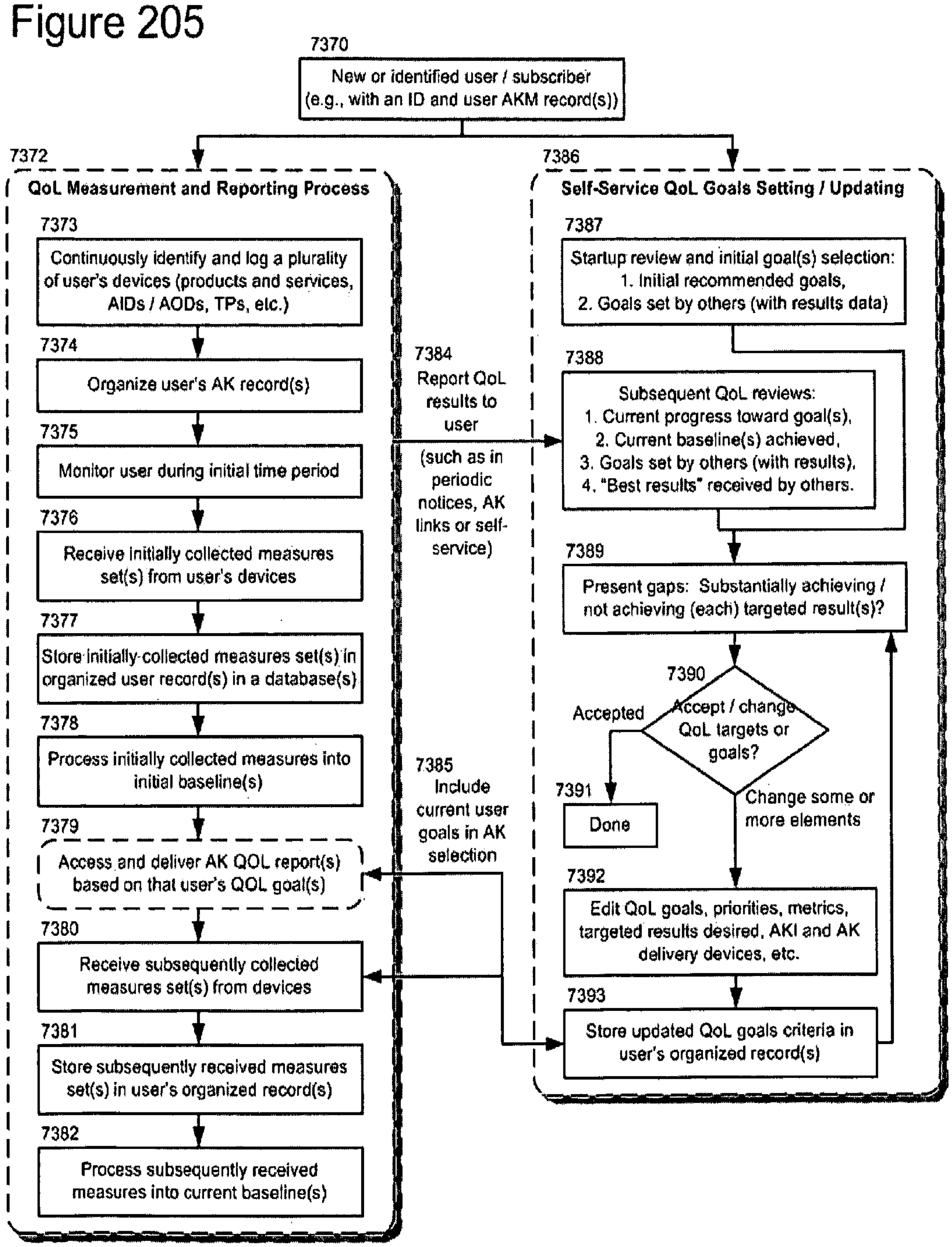

FIG. 205 is a flow chart showing some examples of procedures for an AKM subscriber Quality of Life (QoL) improvement process.

Figure 206:
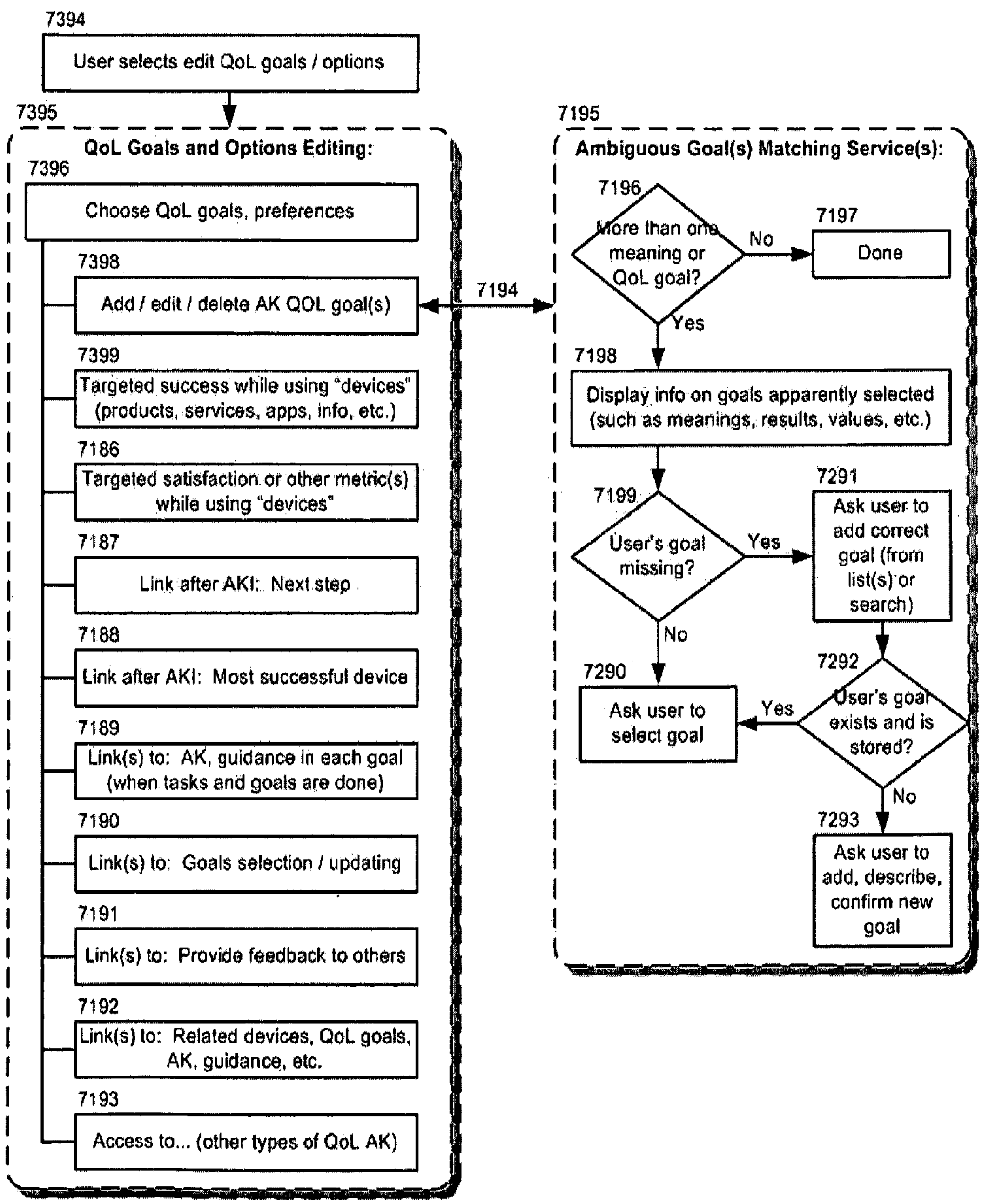

FIG. 206 is a flow chart showing some examples of procedures for editing AKM QoL (Quality of Life) options.

Figure 207:
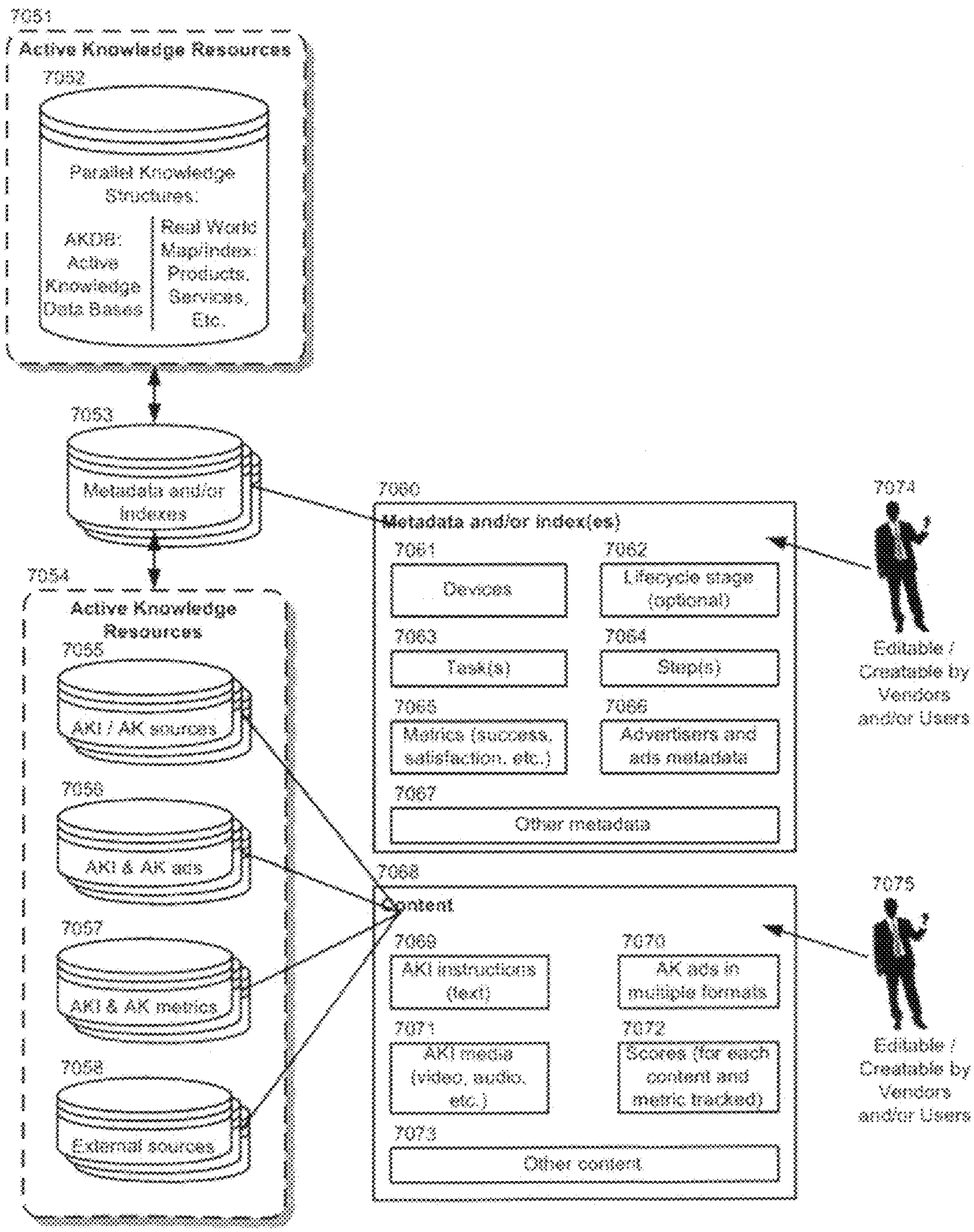

FIG. 207 is a block diagram showing some examples of AK (Active Knowledge) content sources and construction.

Figure 208:
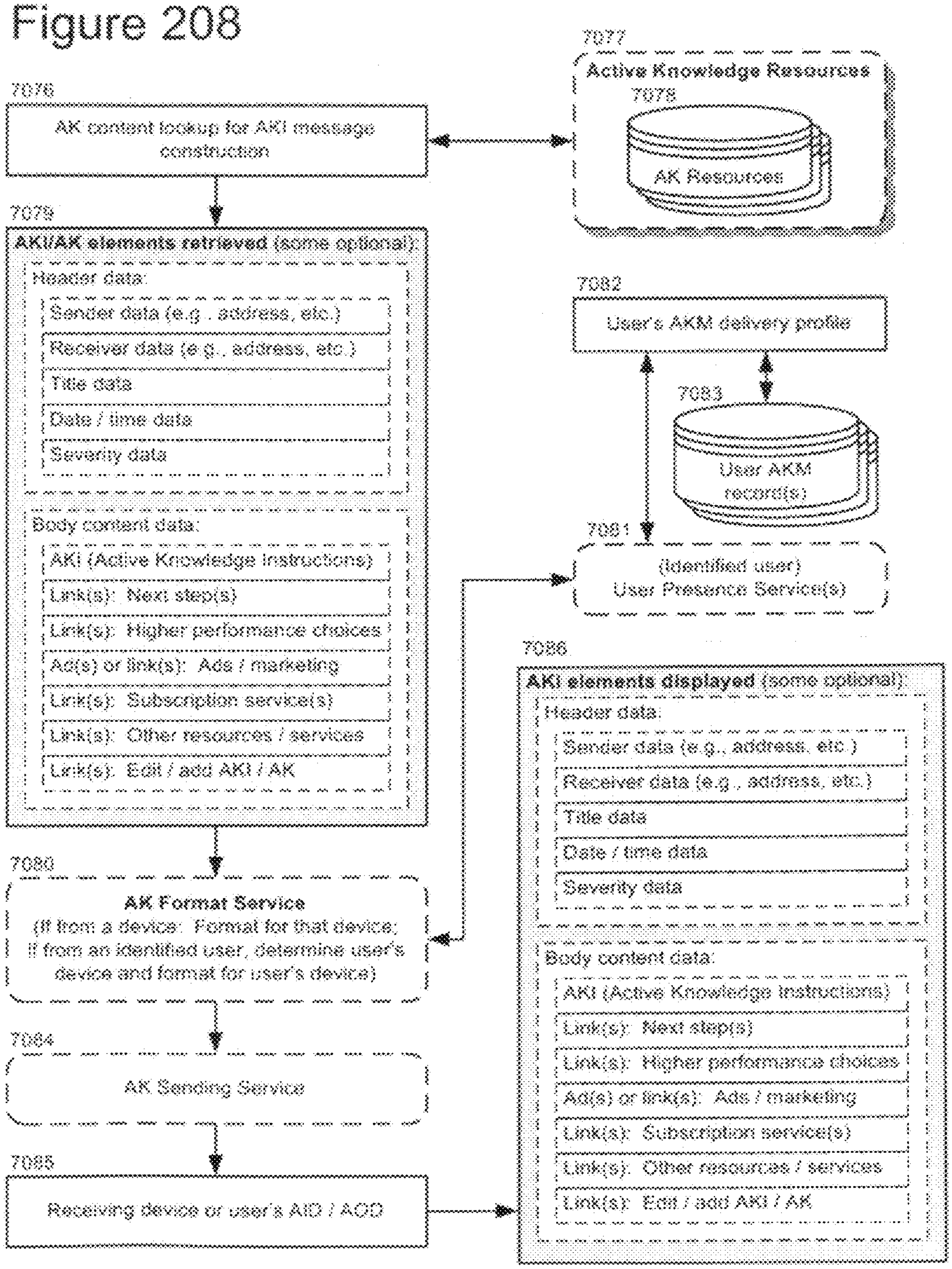

FIG. 208 is a flow chart showing some examples of procedures for AKM message construction and display.

Figure 209:
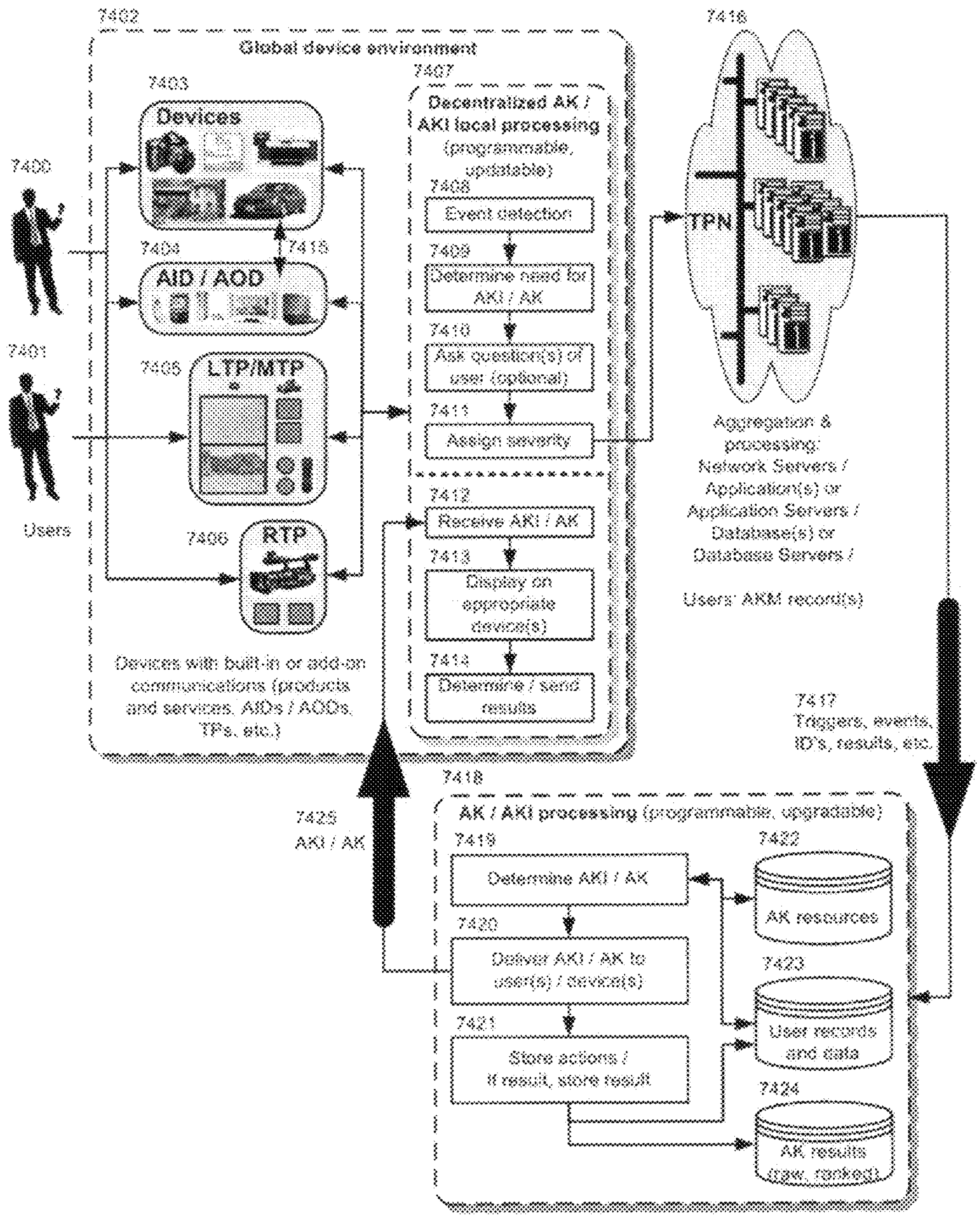

FIG. 209 is a pictorial block diagram and flow chart showing some examples of procedures for a device environment that is decentralized (e.g., fits some devices).

Figure 210:
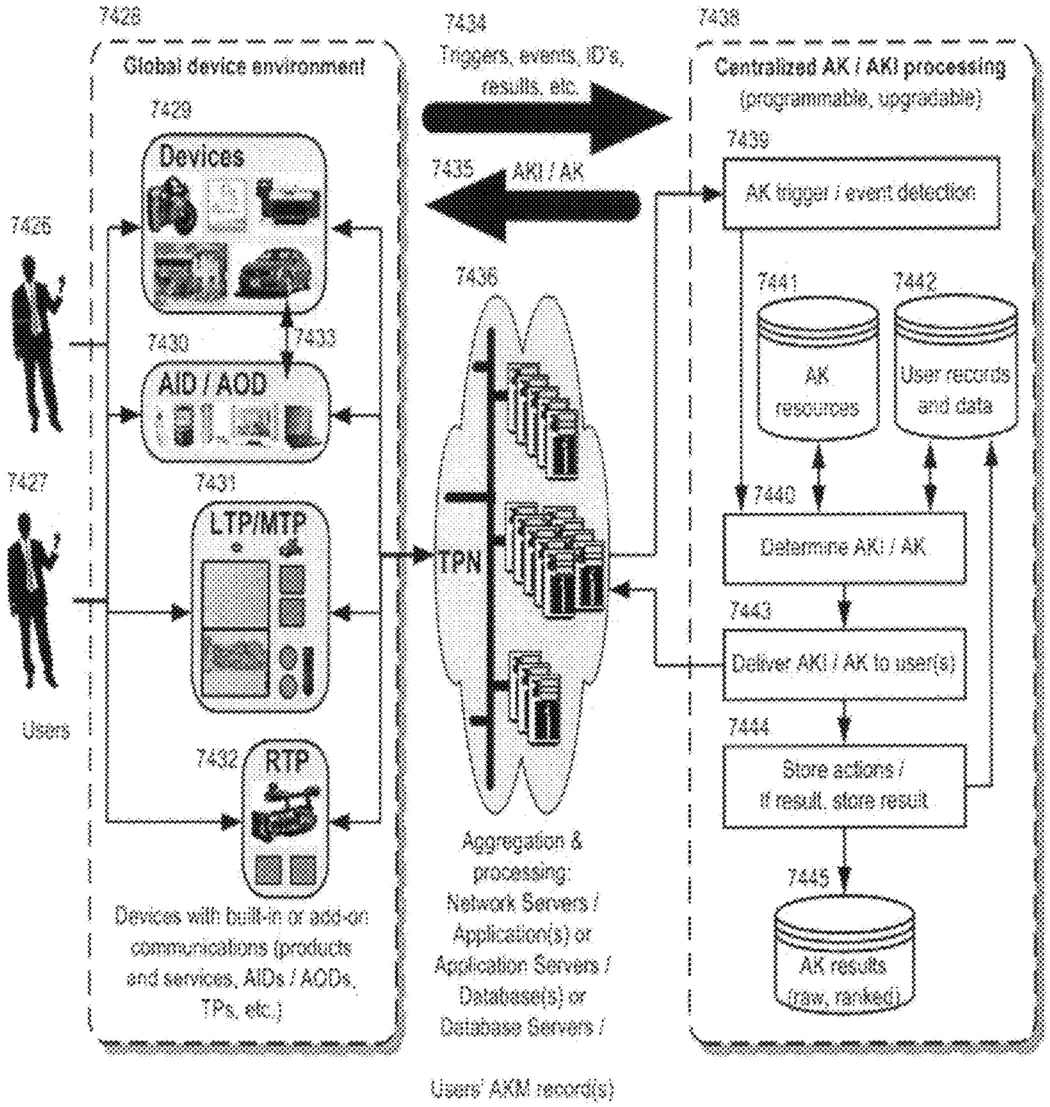

FIG. 210 is a pictorial block diagram and flow chart showing some examples of procedures for a device environment that is centralized (e.g., fits some devices).

Figure 211:
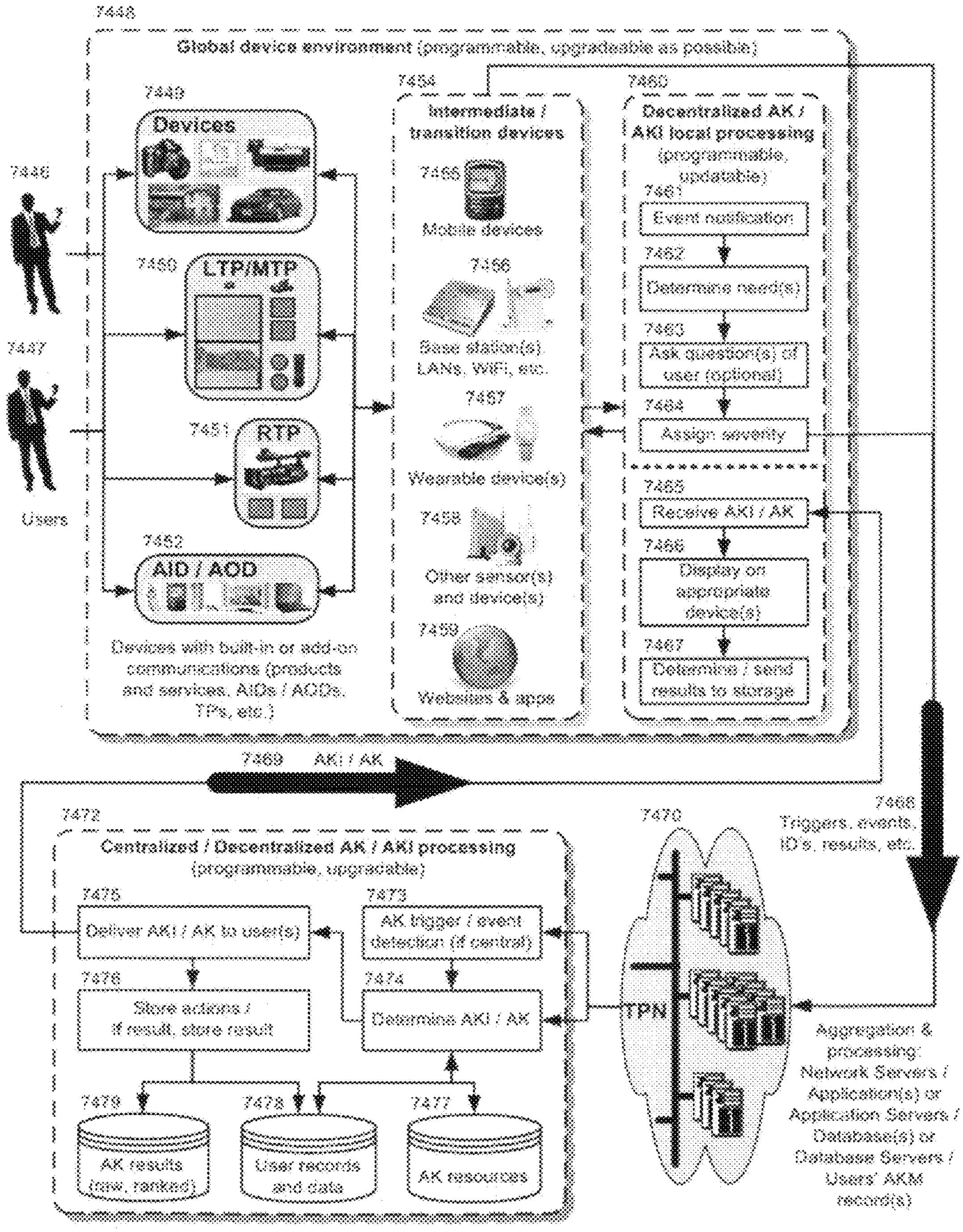

FIG. 211 is a pictorial block diagram and flow chart showing some examples of procedures for a device environment that is a hybrid and uses intermediate/transition devices (e.g., fits some devices).

Figure 212:
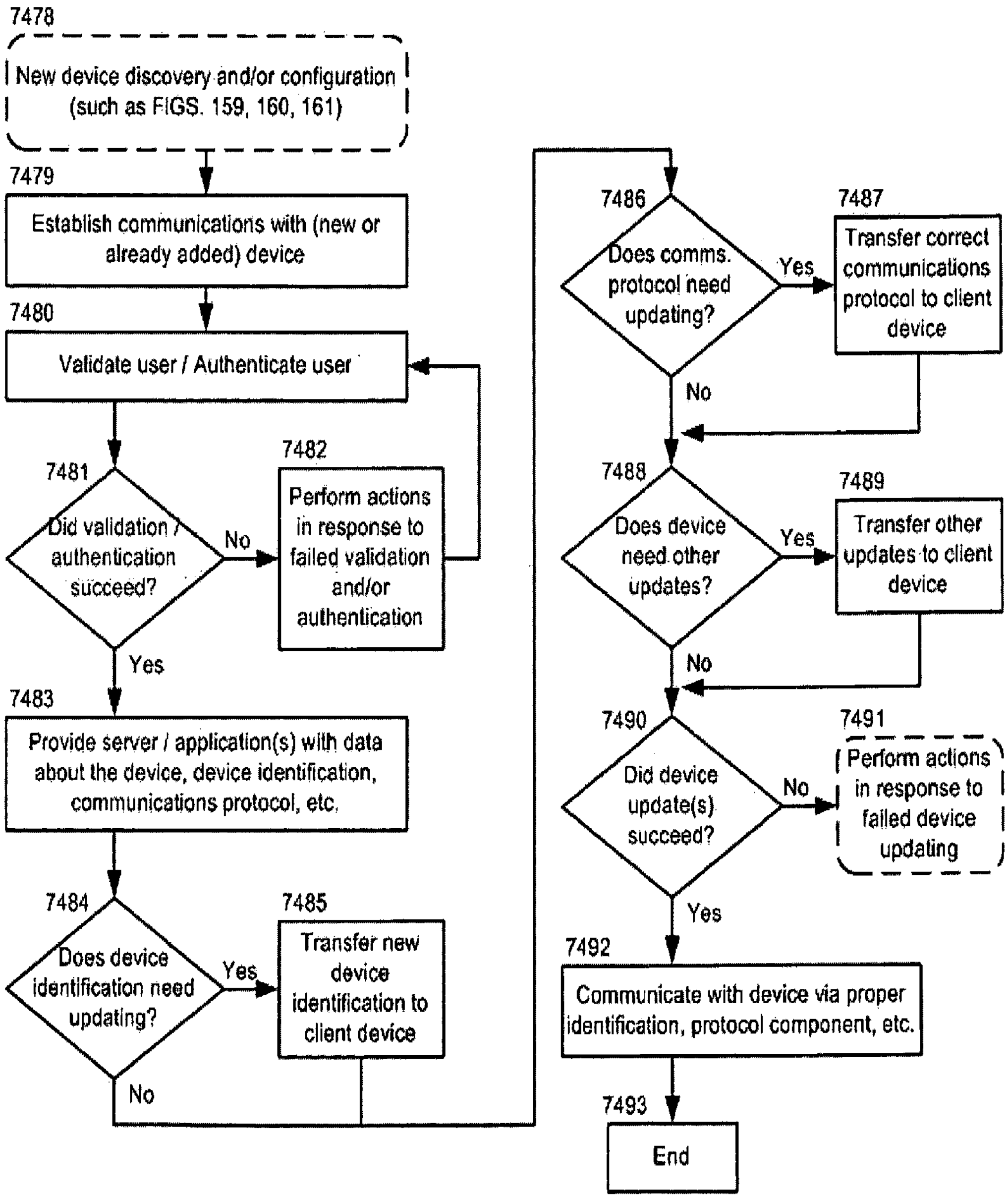

FIG. 212 is a flow chart showing some examples of procedures for adding and/or updating an AKM device, and/or a transition device.

Figure 213:
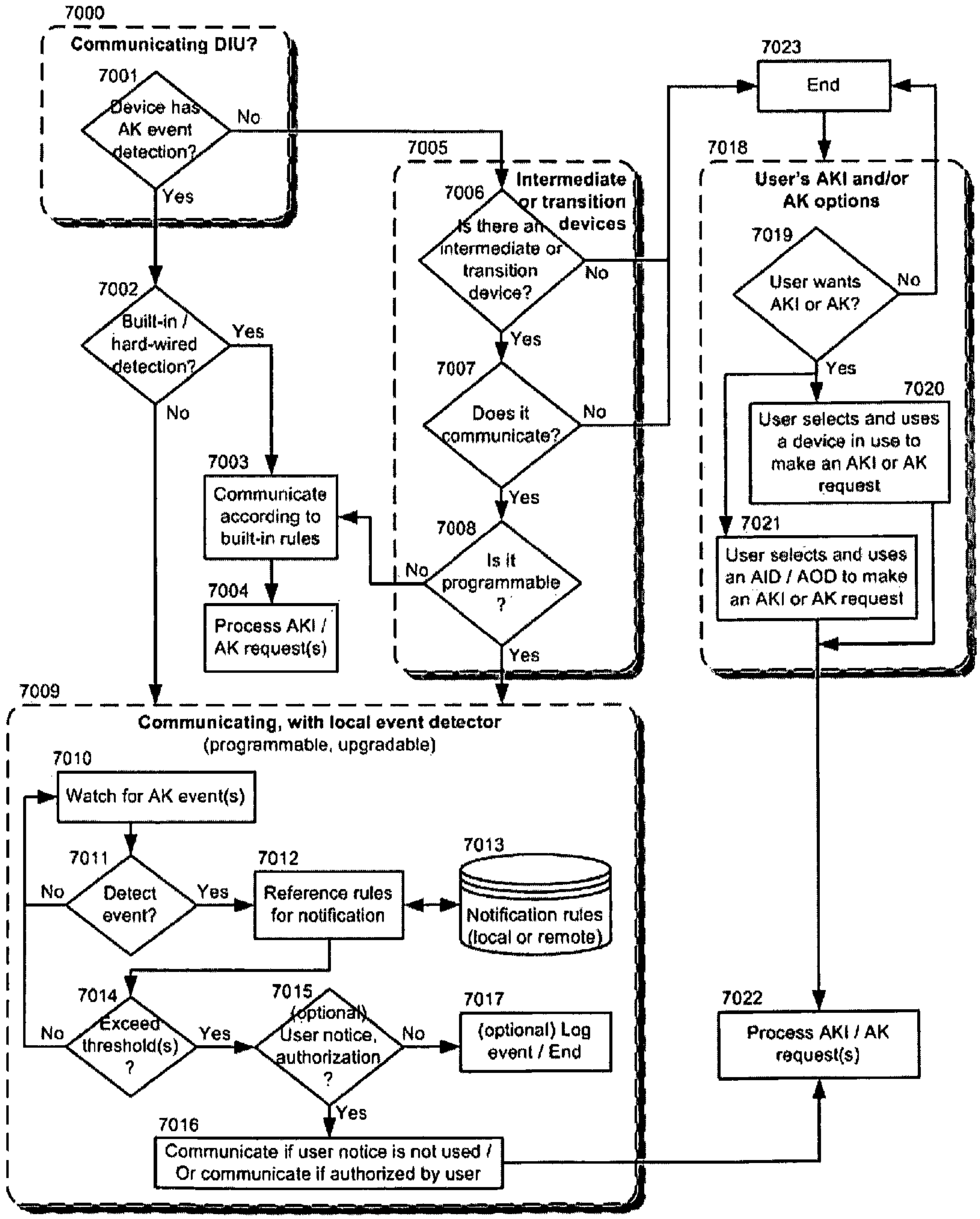

FIG. 213 is a flow chart showing some examples of procedures for device outbound communications.

Figure 214:
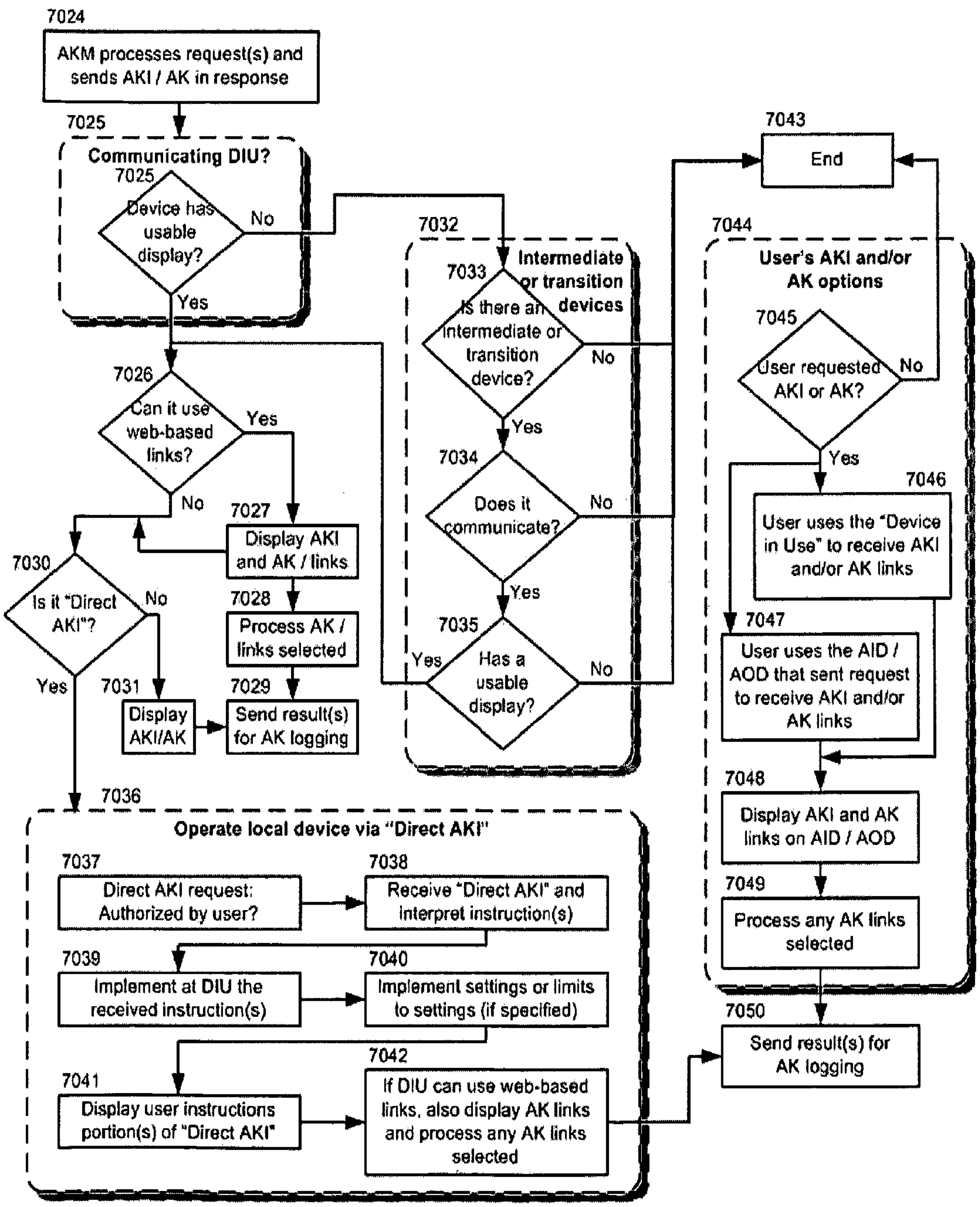

FIG. 214 is a flow chart showing some examples of procedures for device inbound communications.

Figure 215:
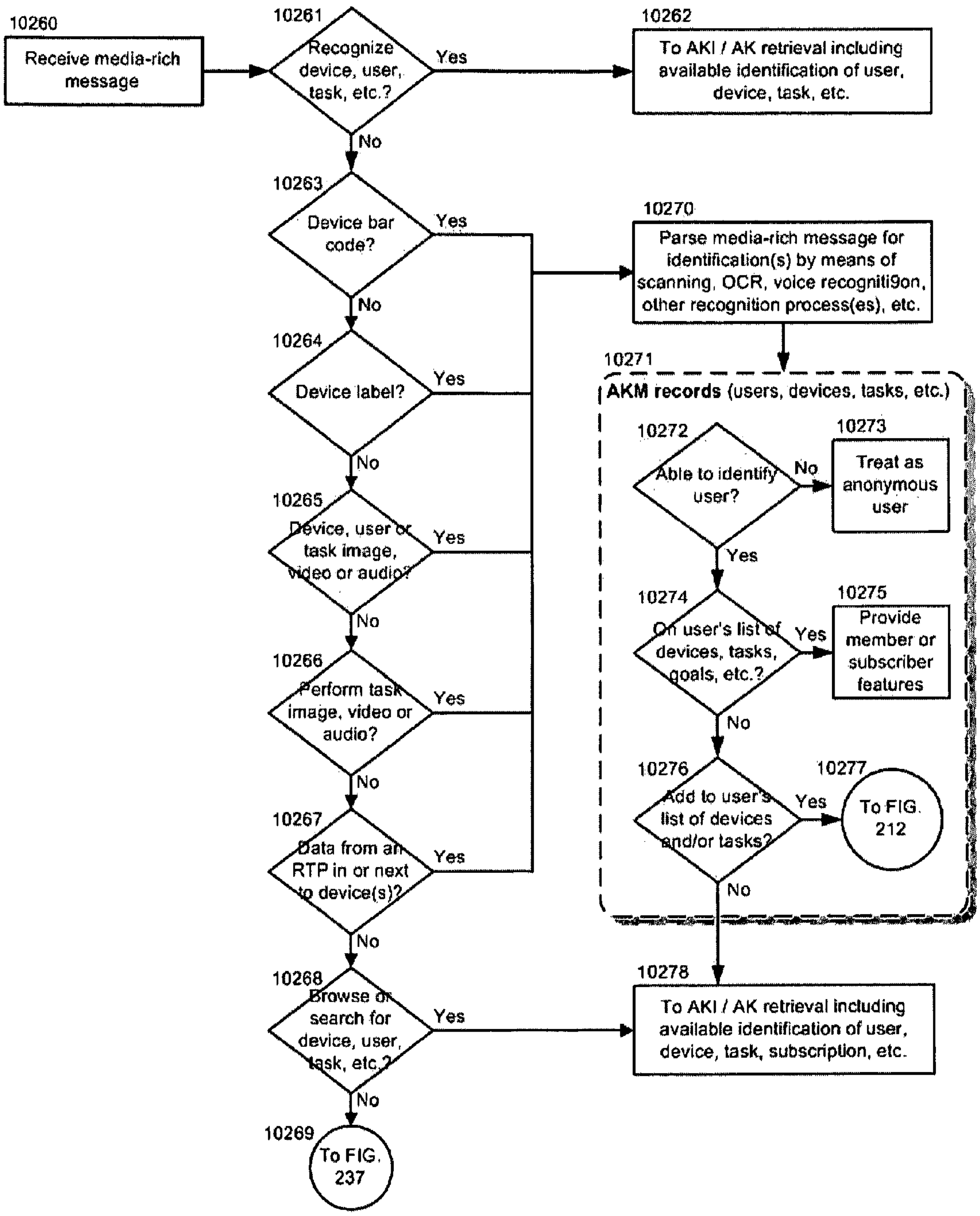

FIG. 215 is a flow chart showing some examples of procedures for AKM multimedia recognition and matching.

Figure 216:
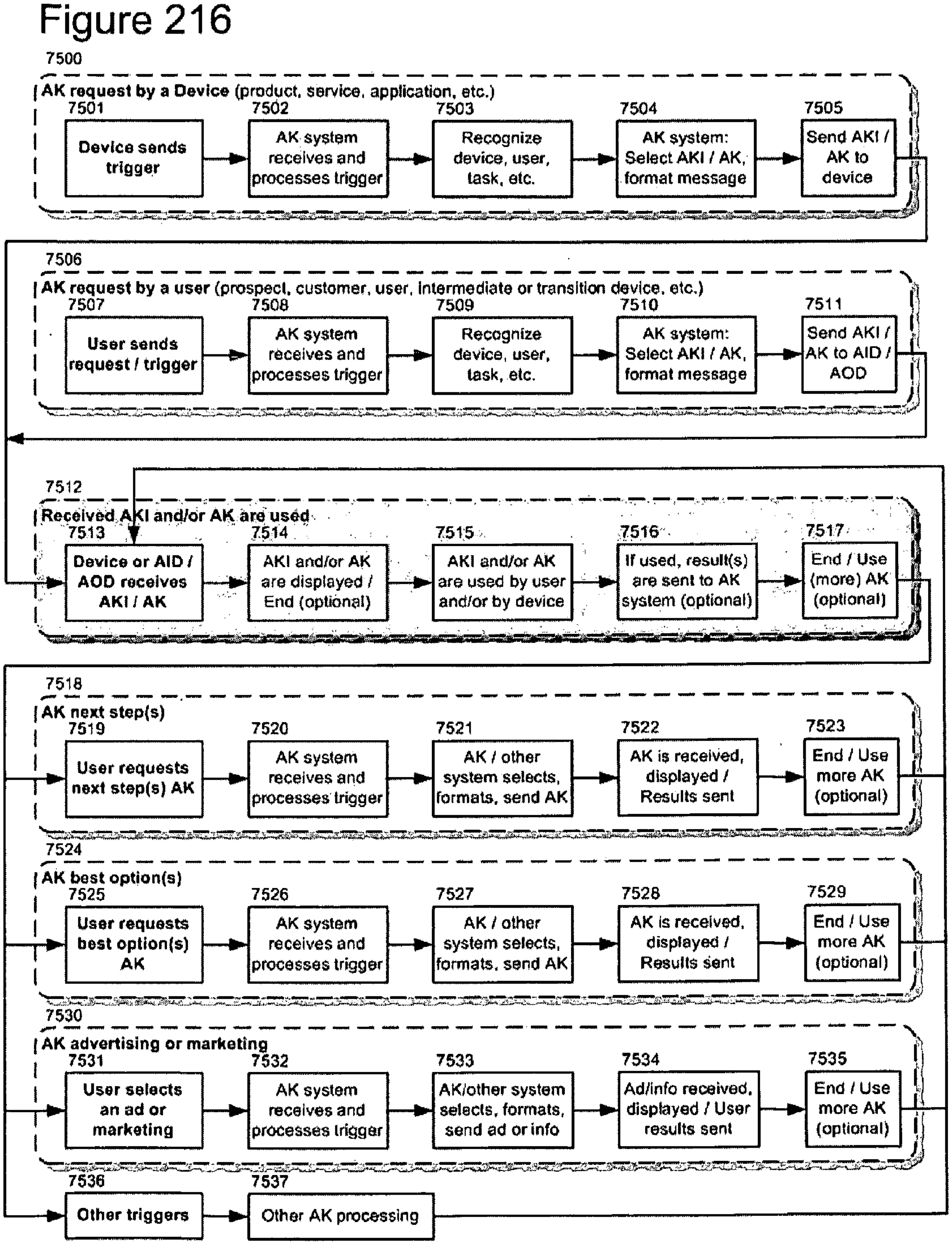

FIG. 216 is a flow chart showing some examples of procedures for AKM triggers hierarchy and triggers processes.

Figure 217:
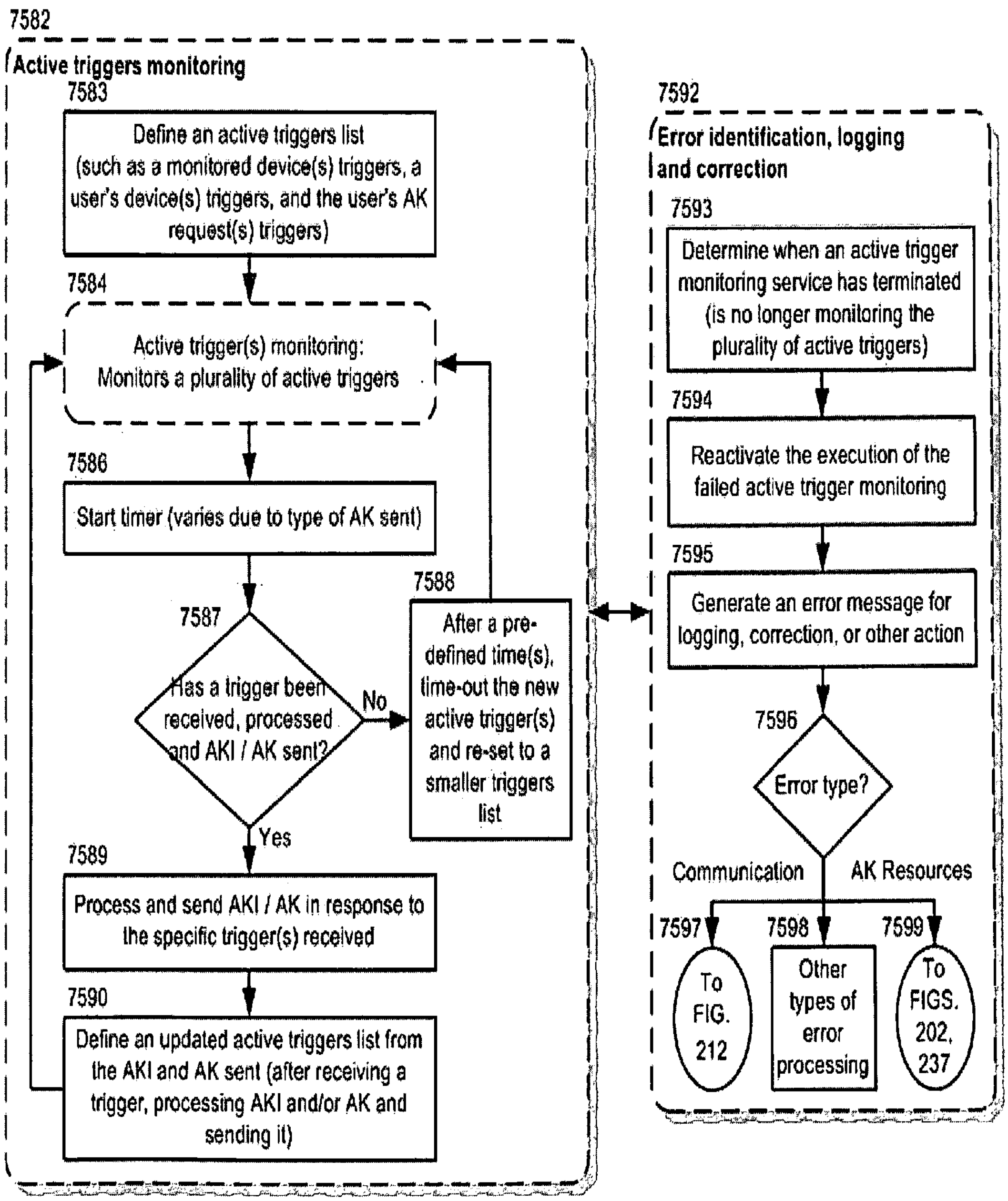

FIG. 217 is a flow chart showing some examples of procedures for AKM triggers flows.

Figure 218:
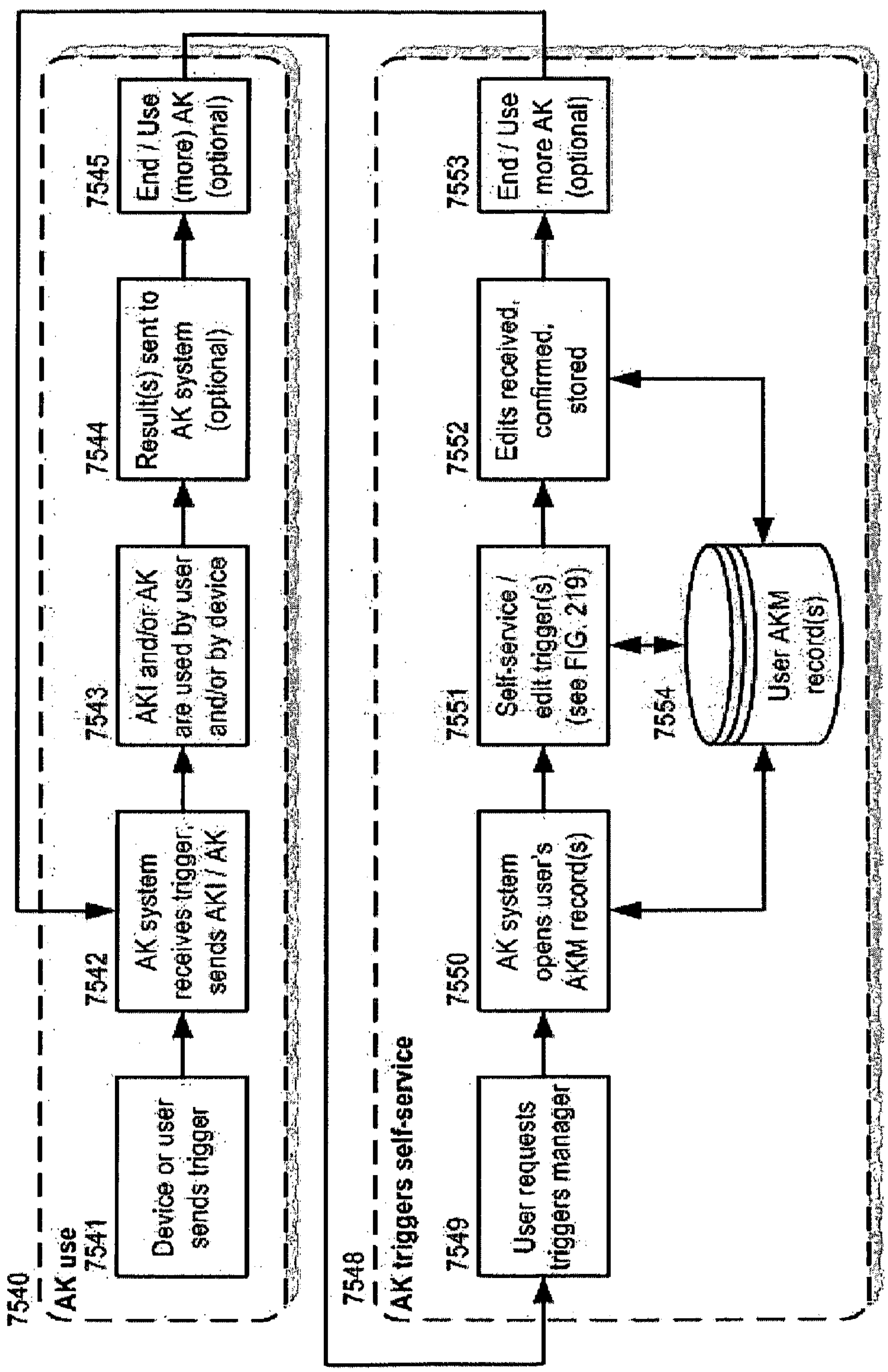

FIG. 218 is a flow chart showing some examples of procedures for AKM triggers self-service management.

Figure 219:
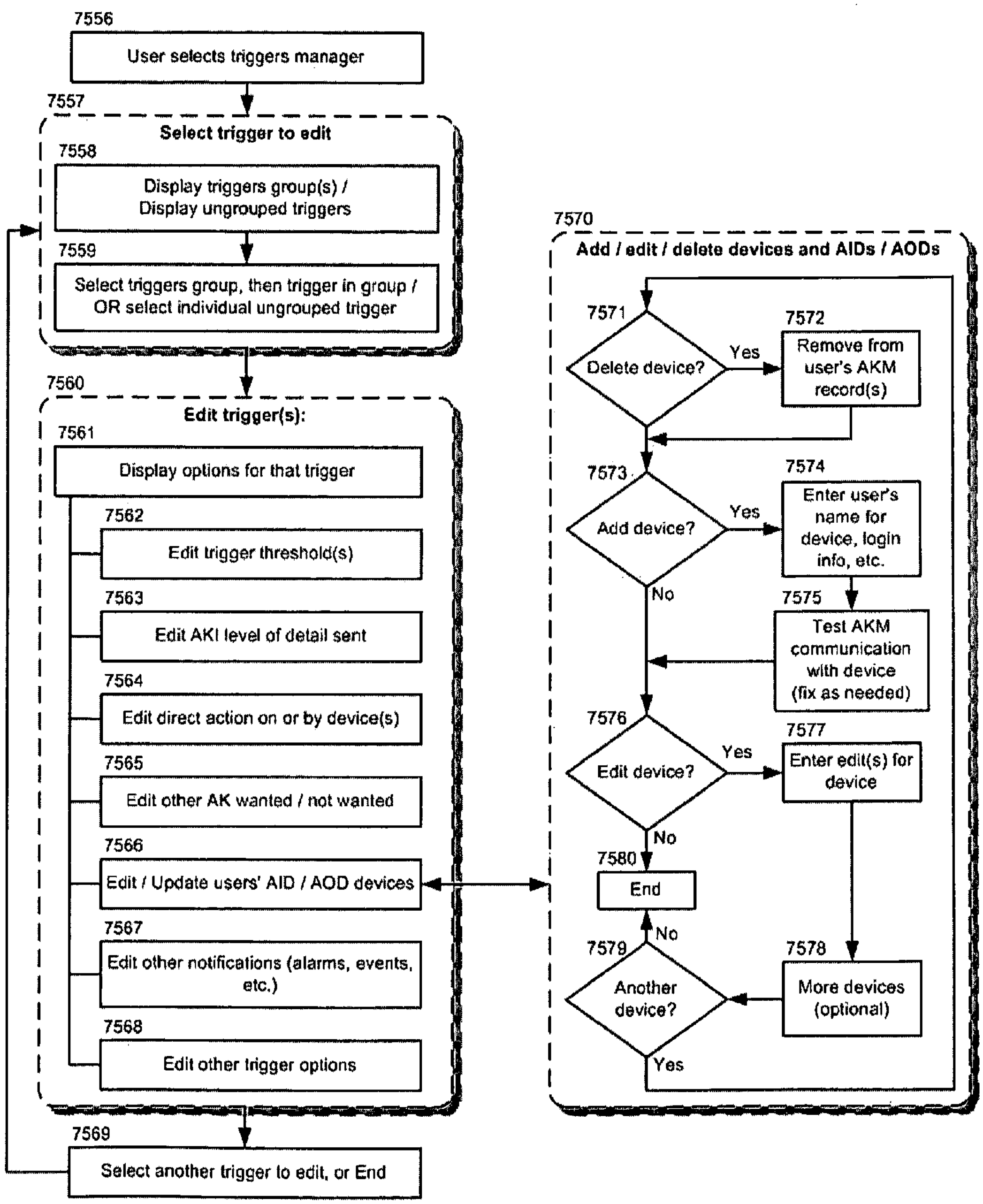

FIG. 219 is a flow chart showing some examples of procedures for editing some AKM triggers options.

Figure 220:
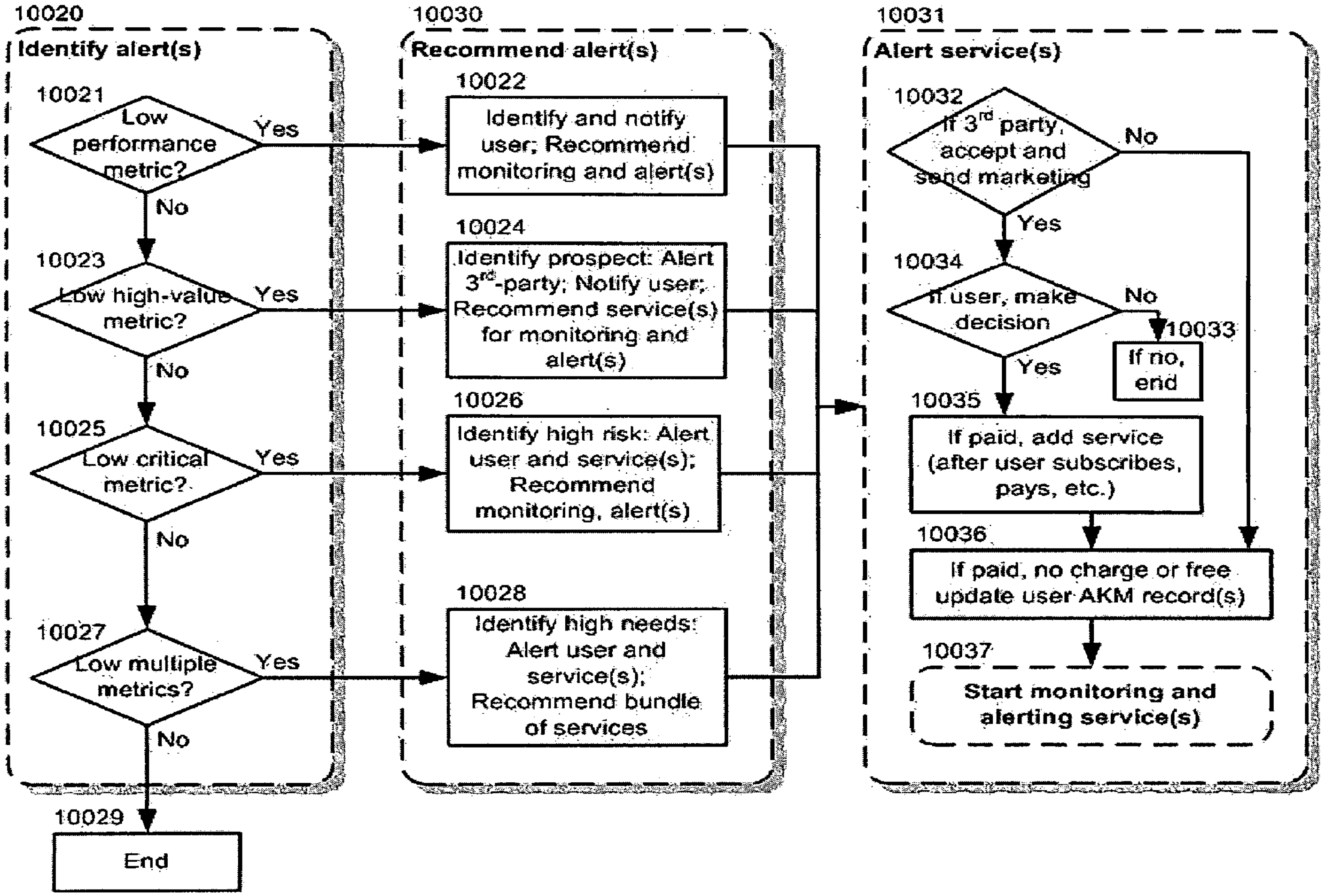

FIG. 220 is a flow chart showing some examples of procedures for AKM automated alerts, including free and/or paid AKM service(s).

Figure 221:
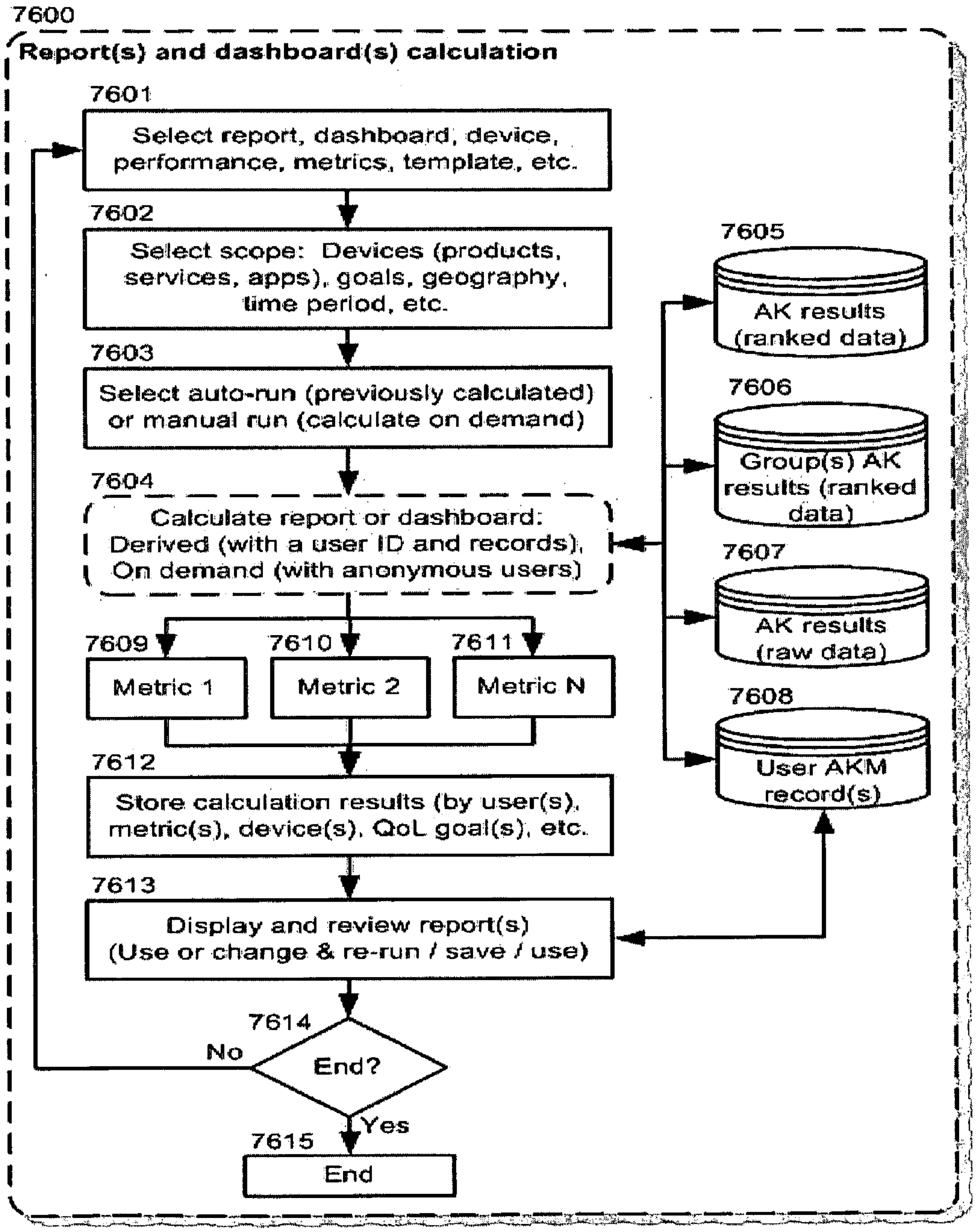

FIG. 221 is a flow chart showing some examples of procedures for calculating AKM reporting and/or dashboards.

Figure 222:
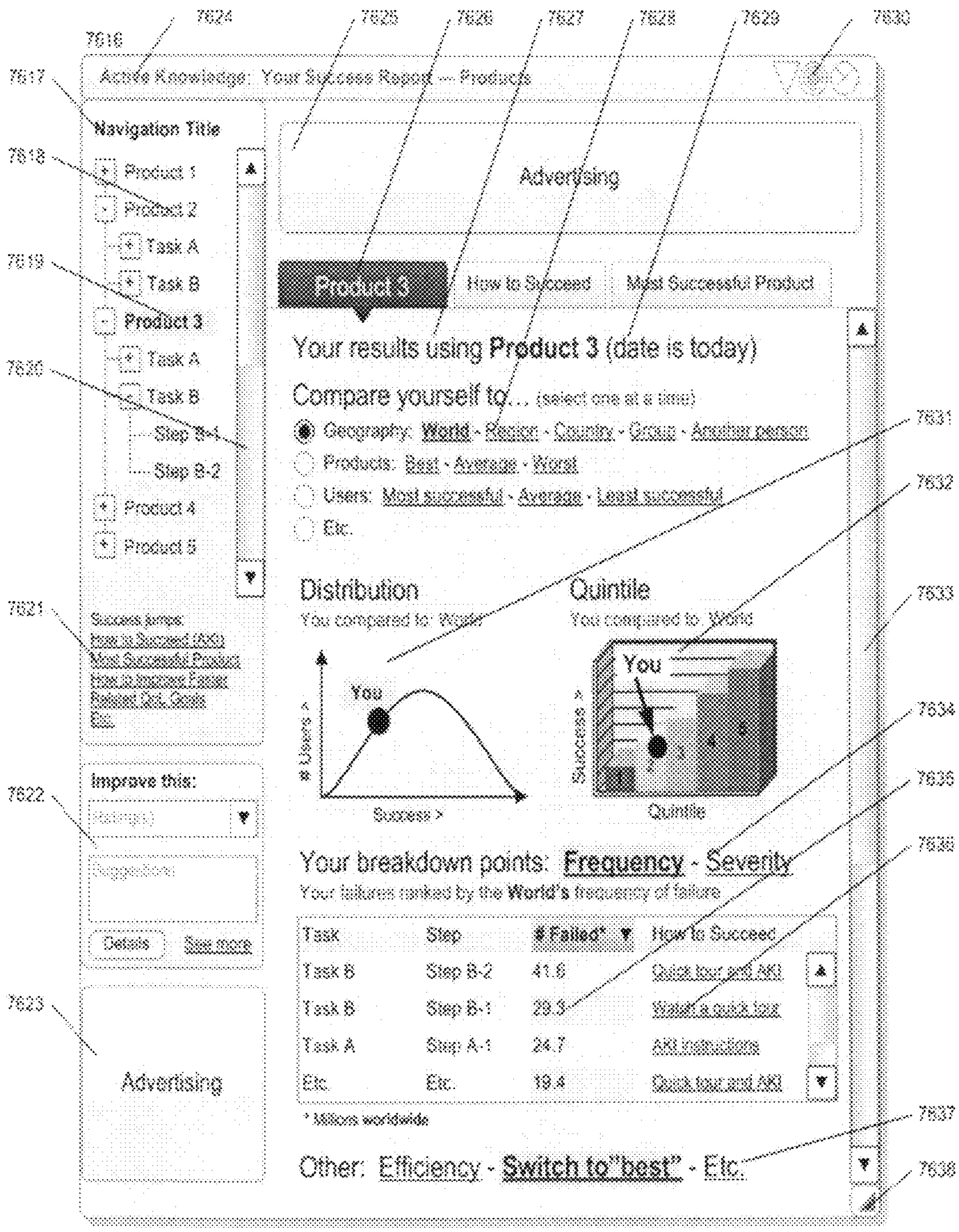

FIG. 222 is a pictorial diagram illustrating an example of AKM reporting by category, for an anonymous user.

Figure 223:
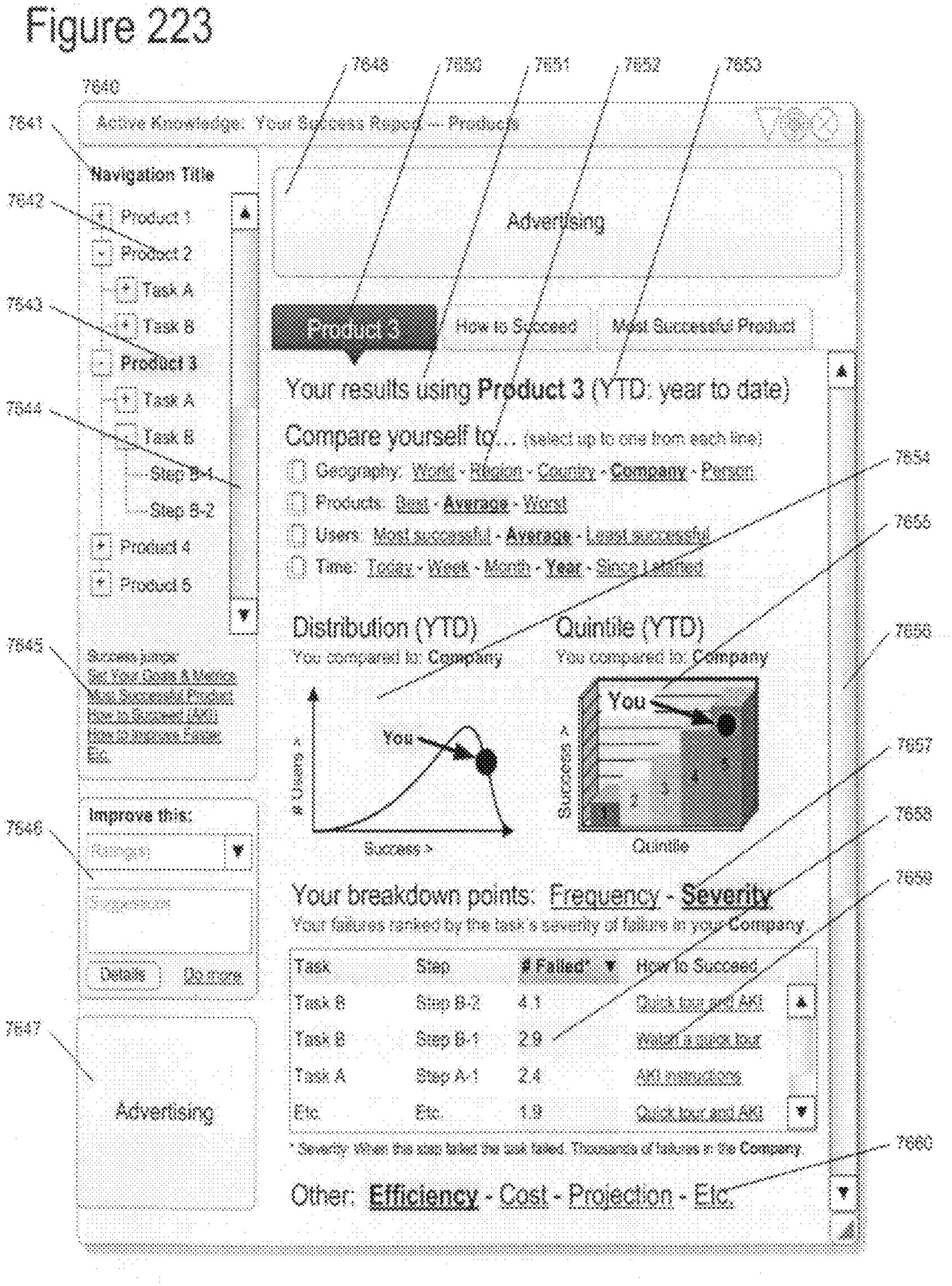

FIG. 223 is a pictorial diagram illustrating an example of AKM reporting by category, for an identified user, and/or a paid service(s).

Figure 224:
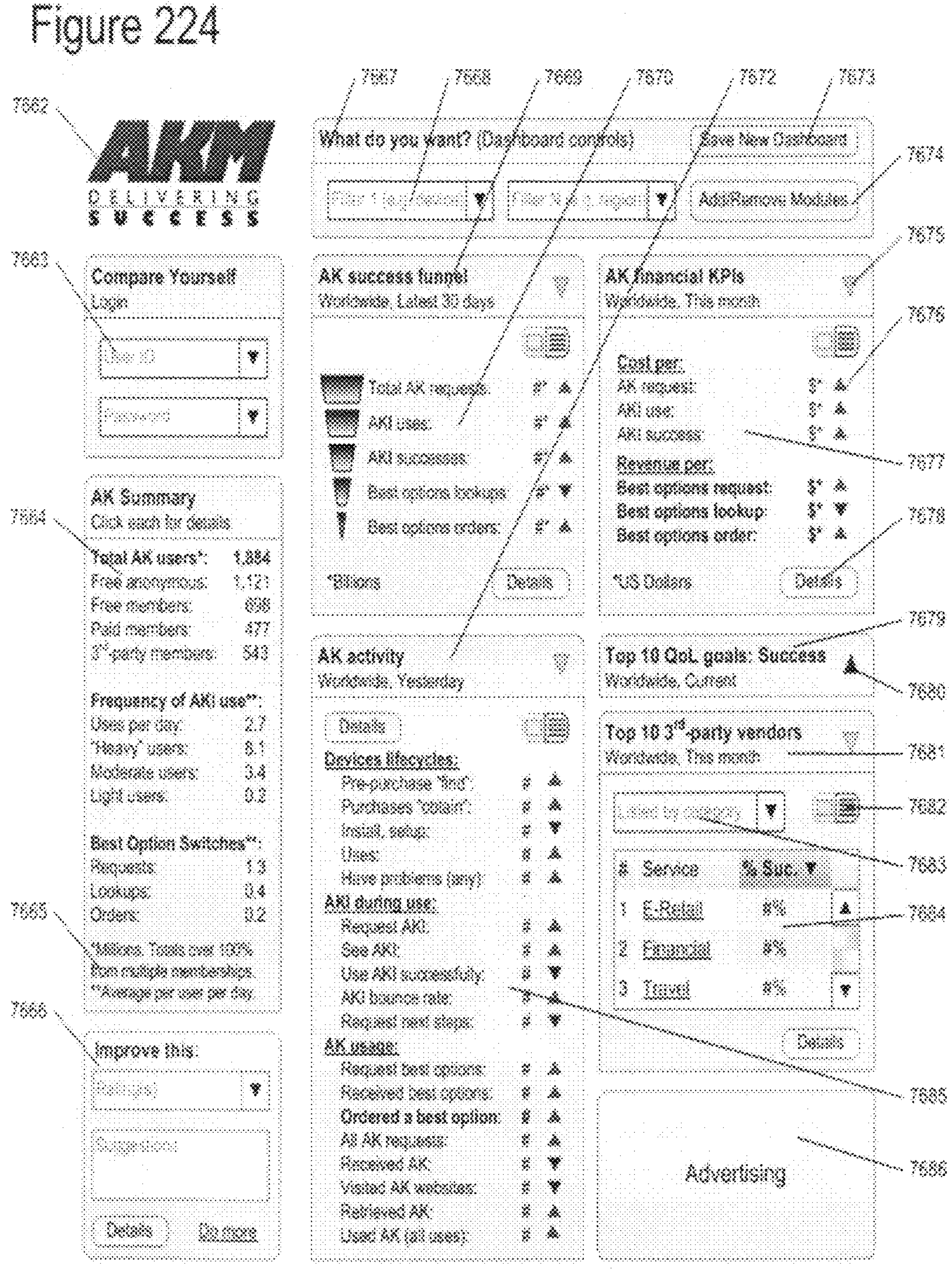

FIG. 224 is a pictorial diagram illustrating an example of an AKM dashboard for anonymous users.

Figure 225:
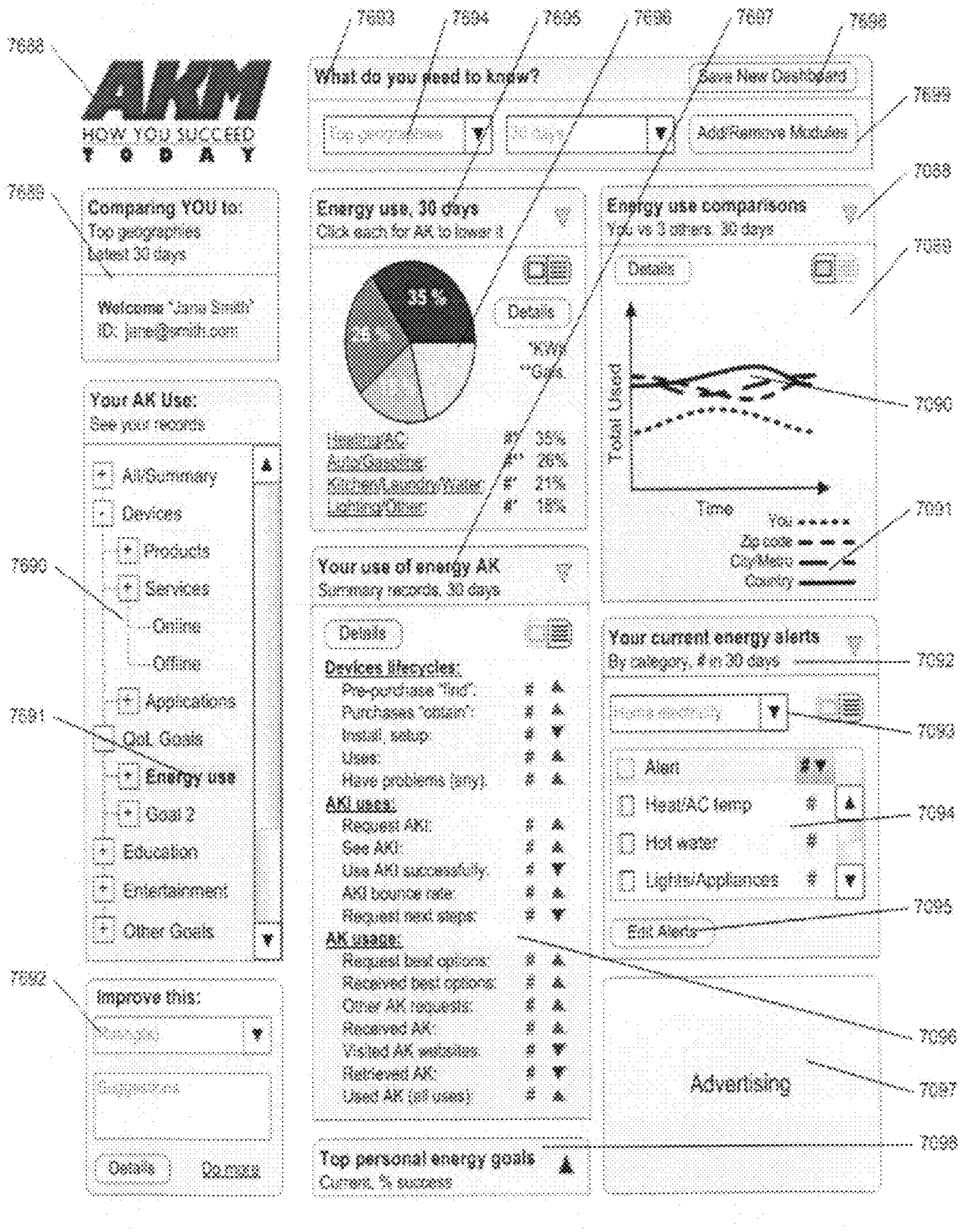

FIG. 225 is a pictorial diagram illustrating an example of an AKM dashboard for an identified users, and/or a paid service(s).

Figure 226:
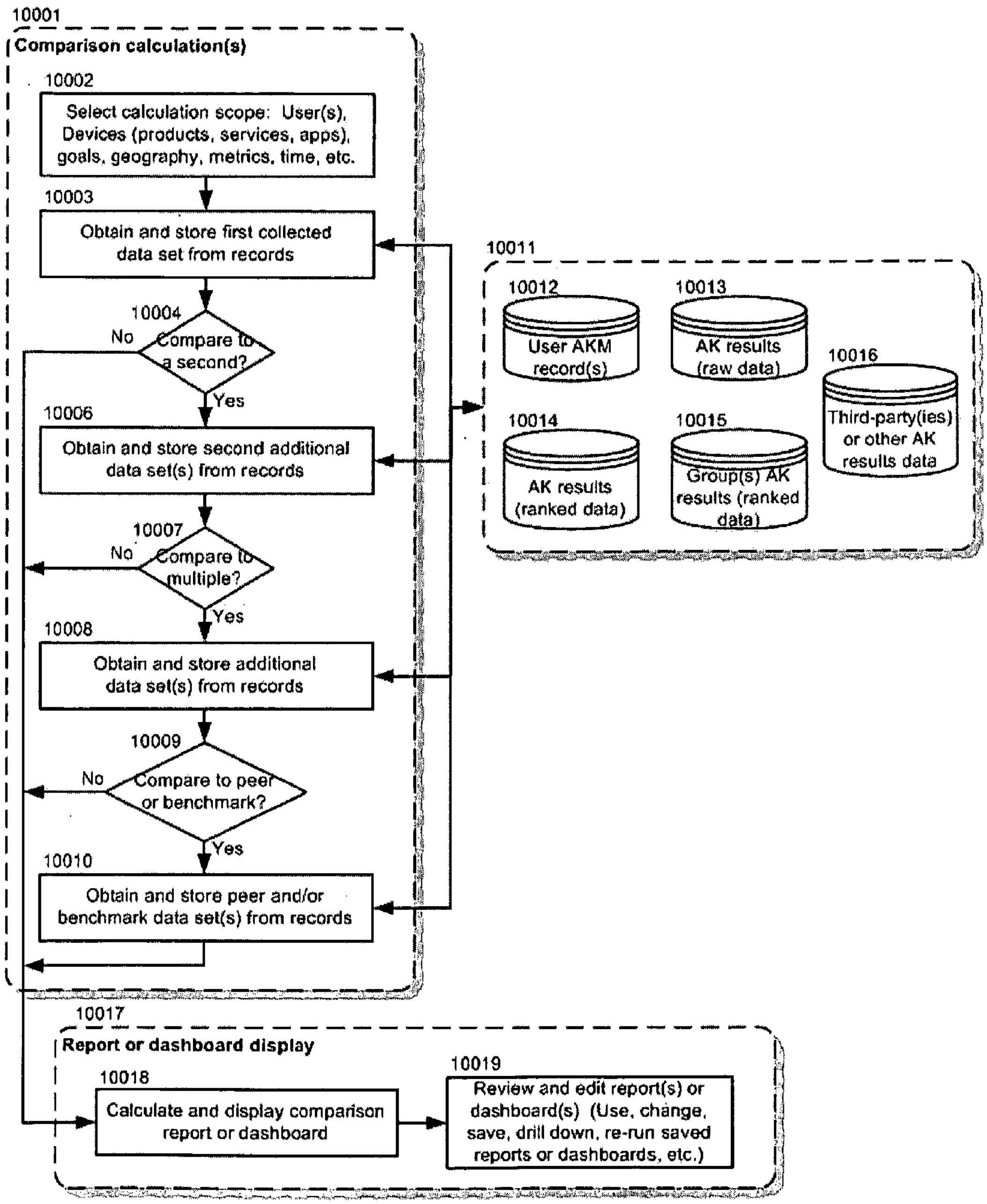

FIG. 226 is a flow chart showing some examples of procedures for comparative reporting.

Figure 227:
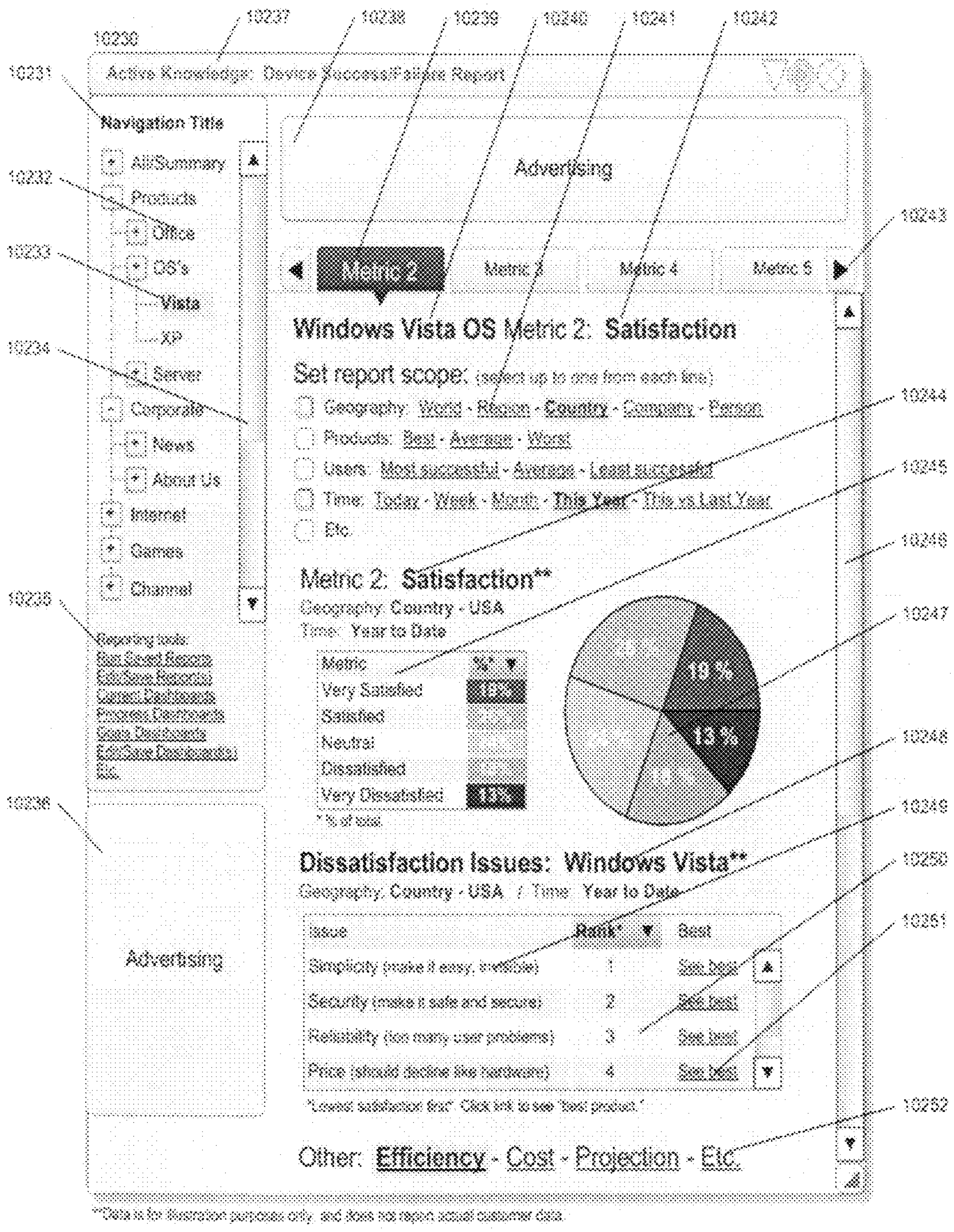

FIG. 227 is a pictorial diagram illustrating some examples of AKM reporting for product vendors and/or their customers.

Figure 228:
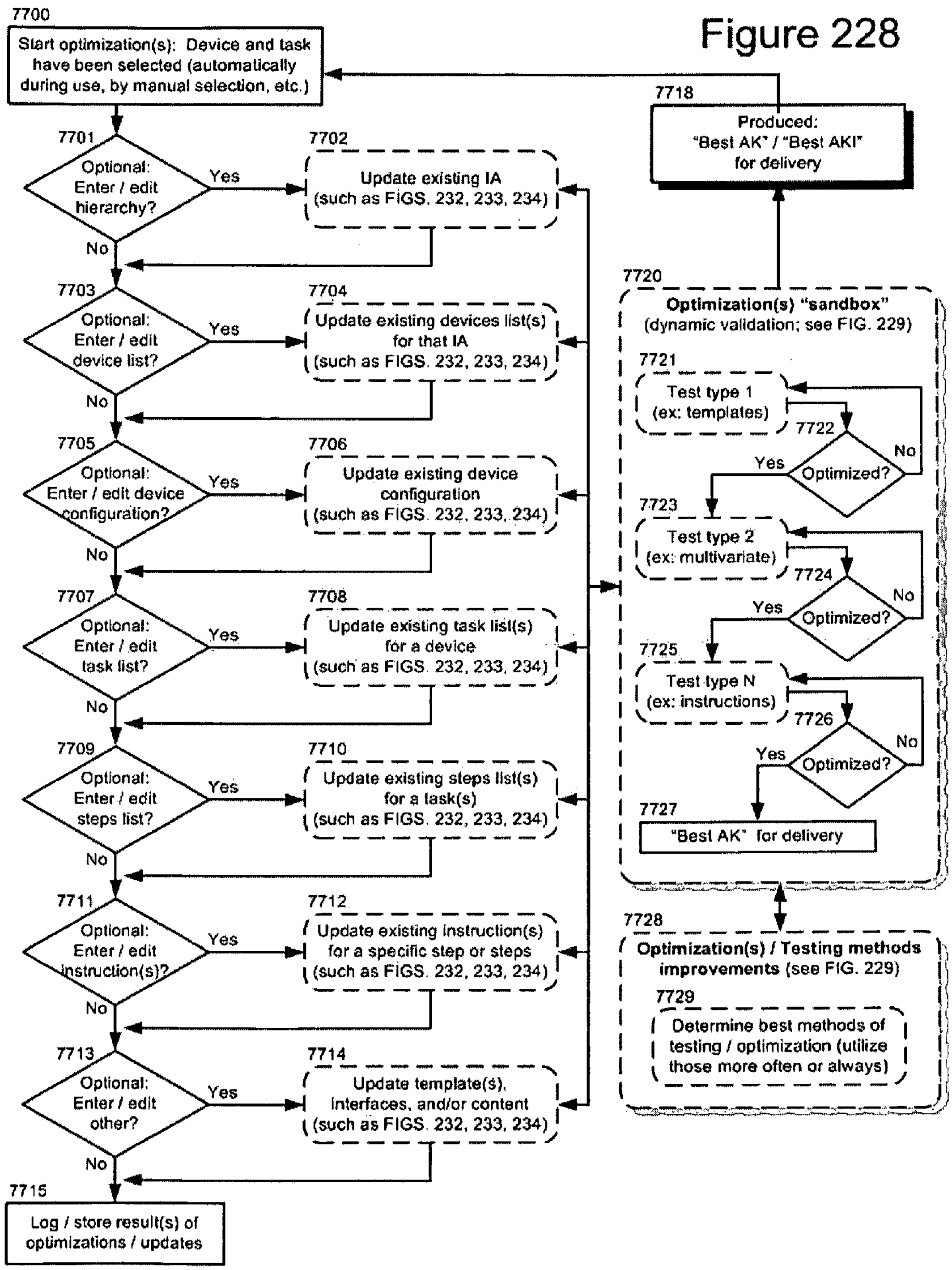

FIG. 228 is a flow chart showing some high-level examples of procedures for AKM optimizations.

Figure 229:
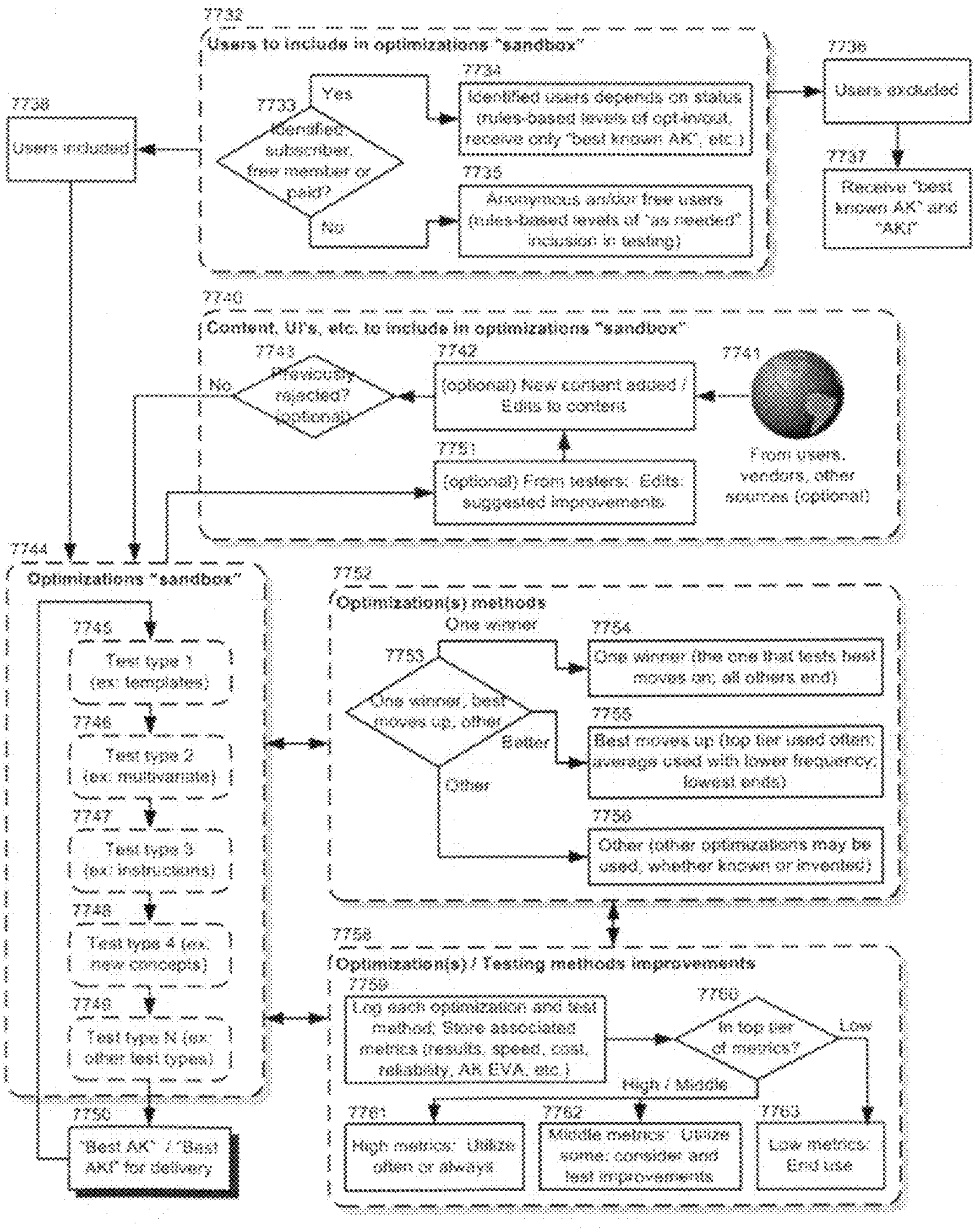

FIG. 229 is a flow chart showing some examples of procedures for AKM optimization "sandbox" testing, including optimization process improvements.

Figure 230:
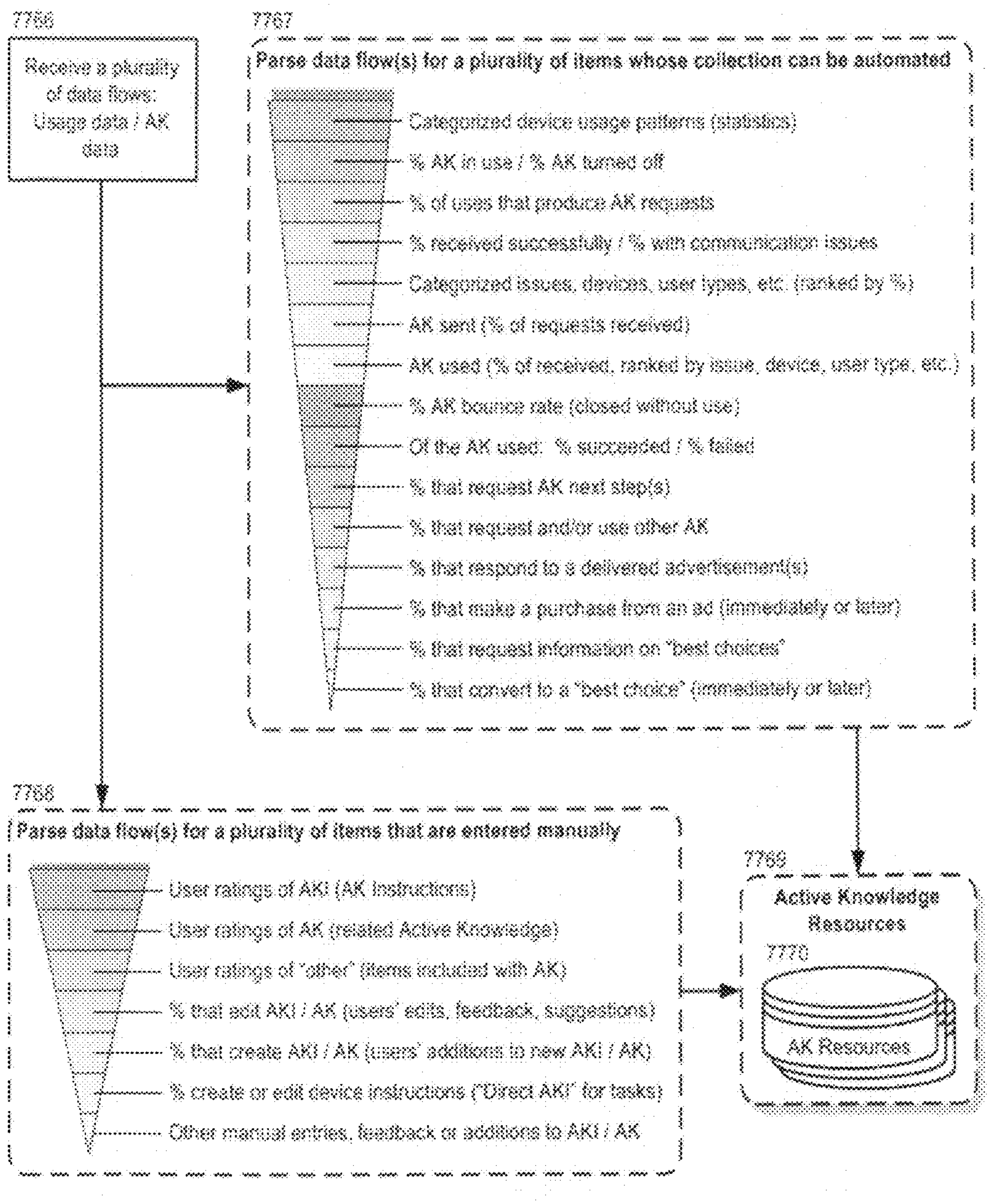

FIG. 230 is a pictorial diagram illustrating some examples of AKM optimizations data sources and resources.

Figure 231:
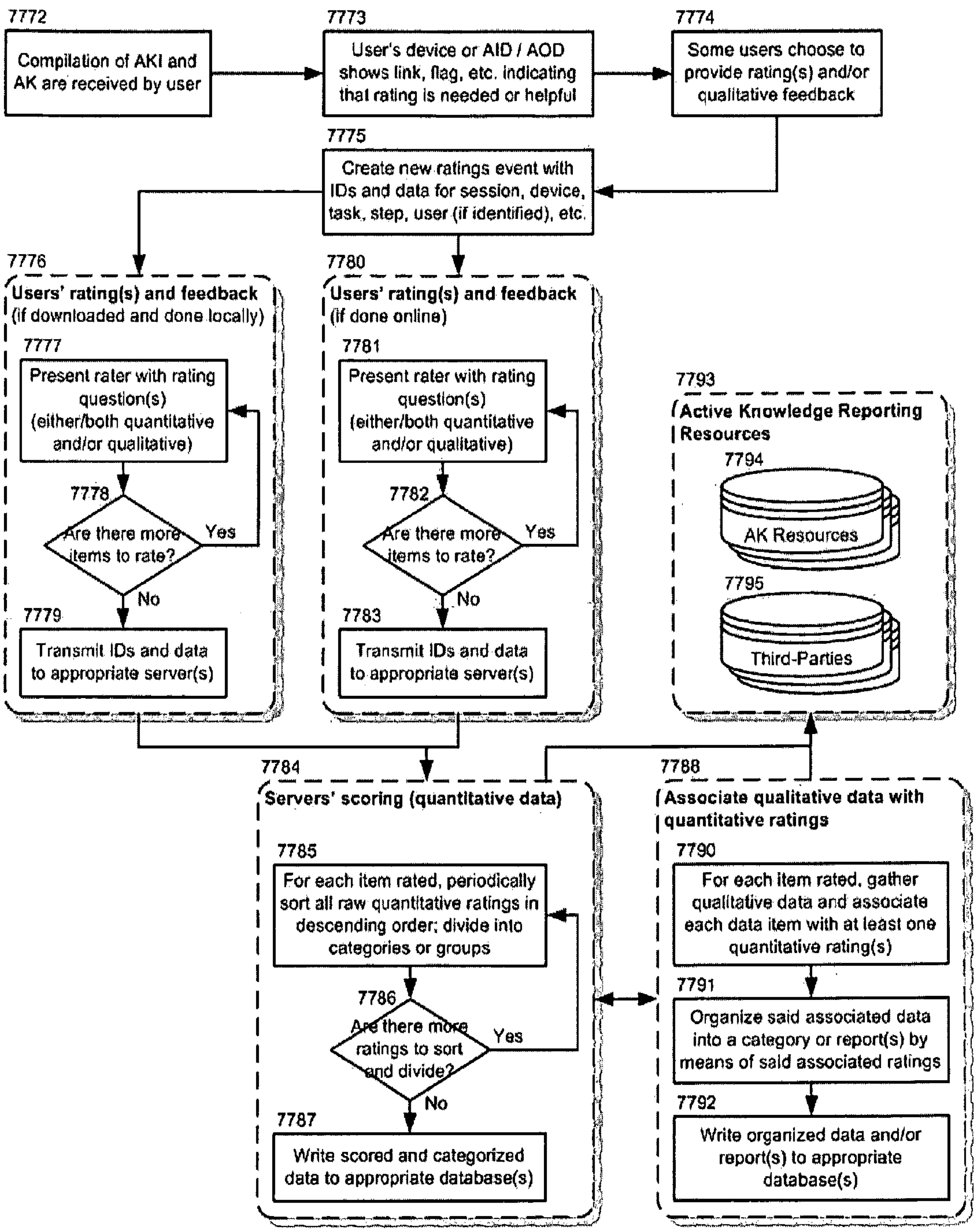

FIG. 231 is a flow chart showing some examples of procedures for AKM optimizations manual rating and/or feedback system(s).

Figure 232:
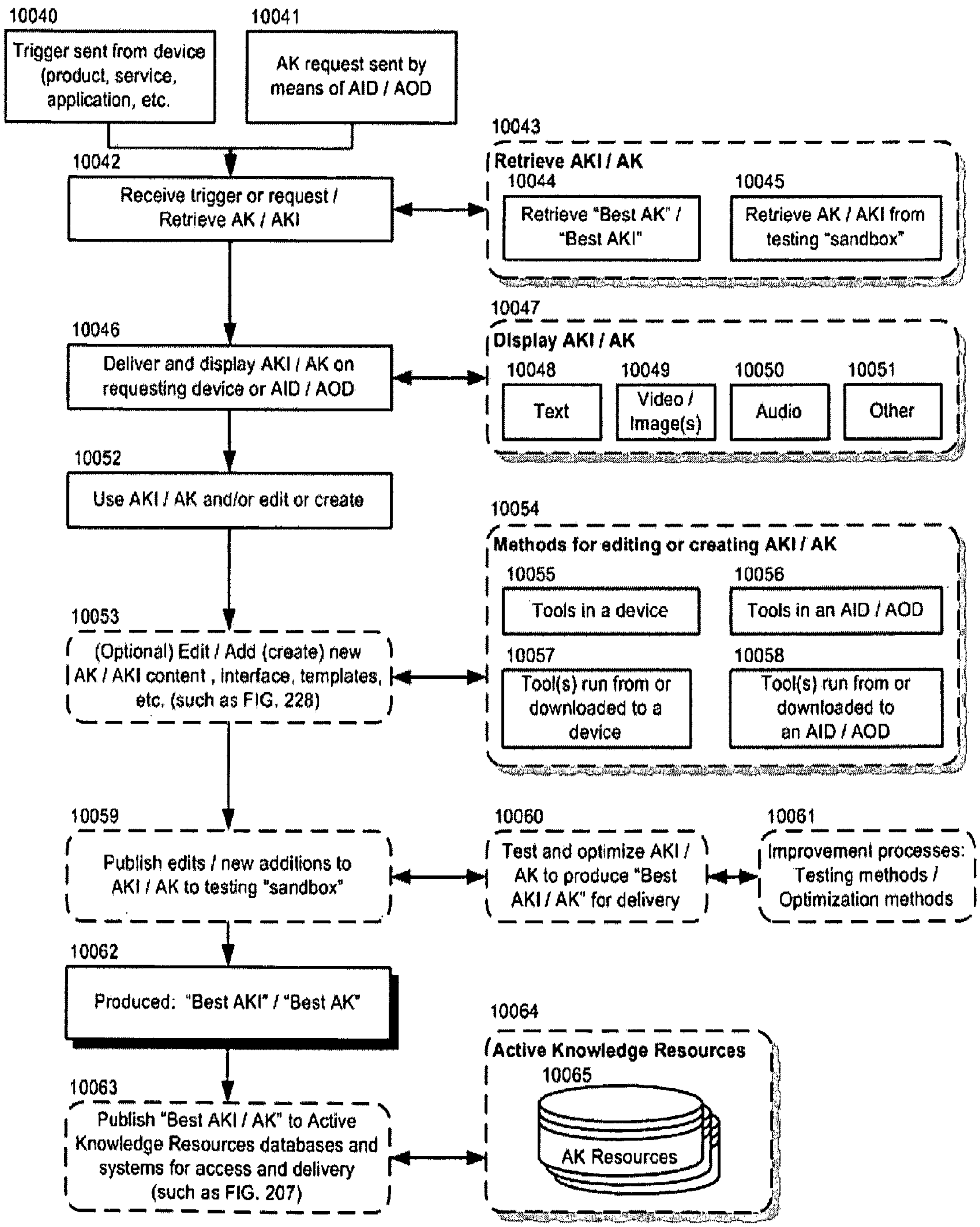

FIG. 232 is a flow chart showing some examples of procedures for AKM dynamic content addition/editing.

Figure 233:
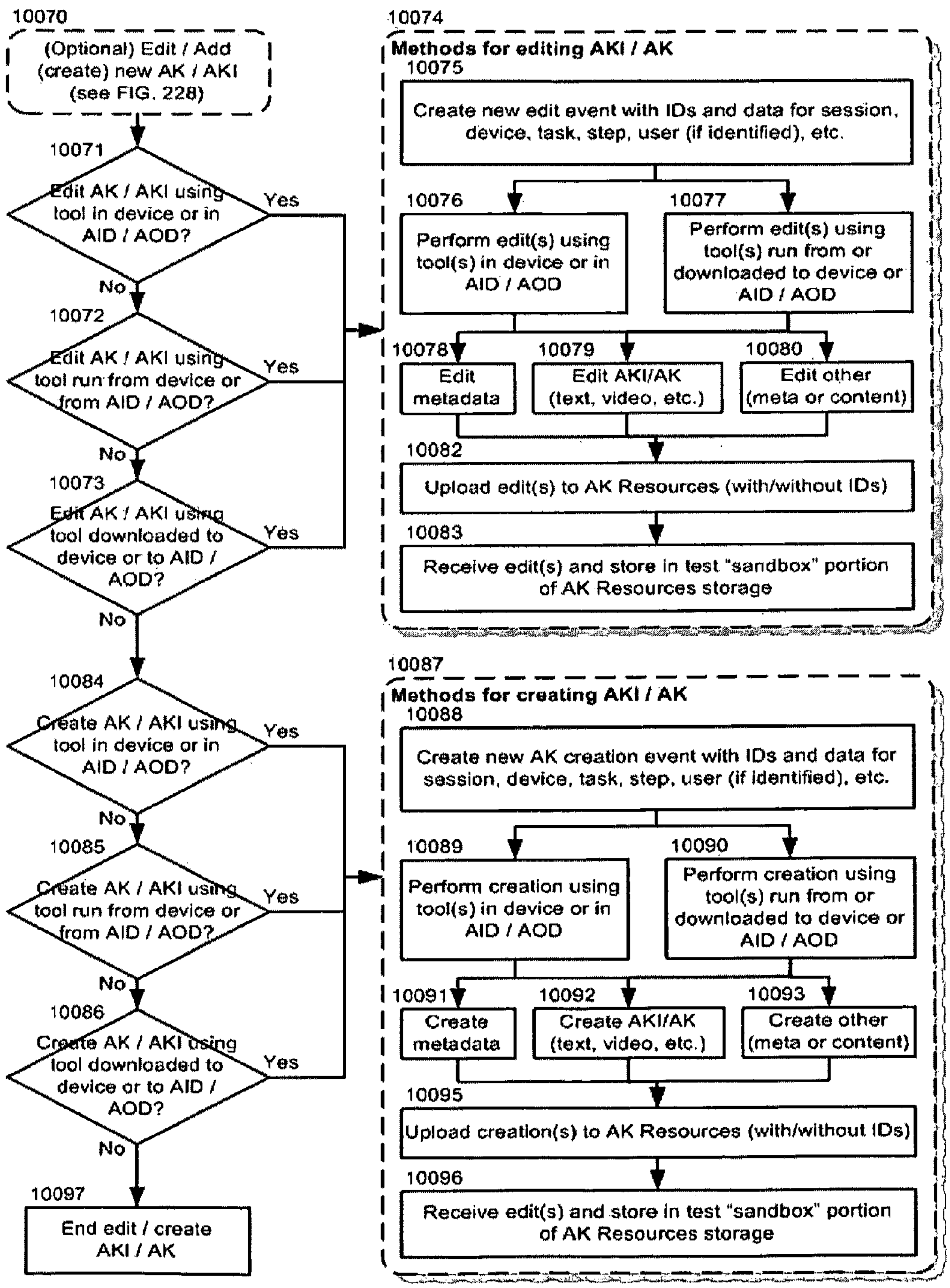

FIG. 233 is a flow chart showing some examples of procedures for AKM methods for editing/creating AKI (Active Knowledge Instructions)/AK (Active Knowledge).

Figure 234:
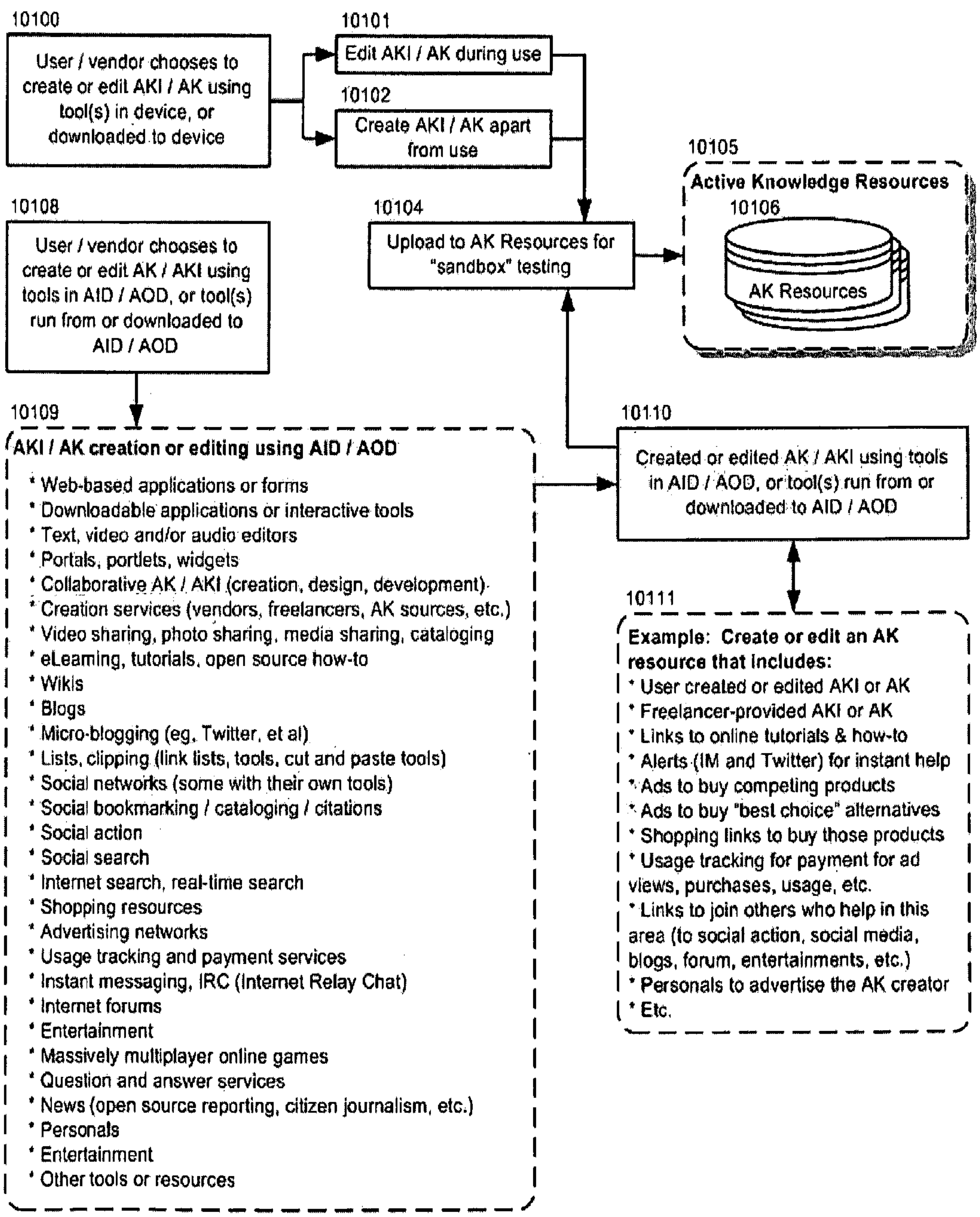

FIG. 234 is a block diagram illustrating some examples of media and tools for AKI/AK content creation.

Figure 235:
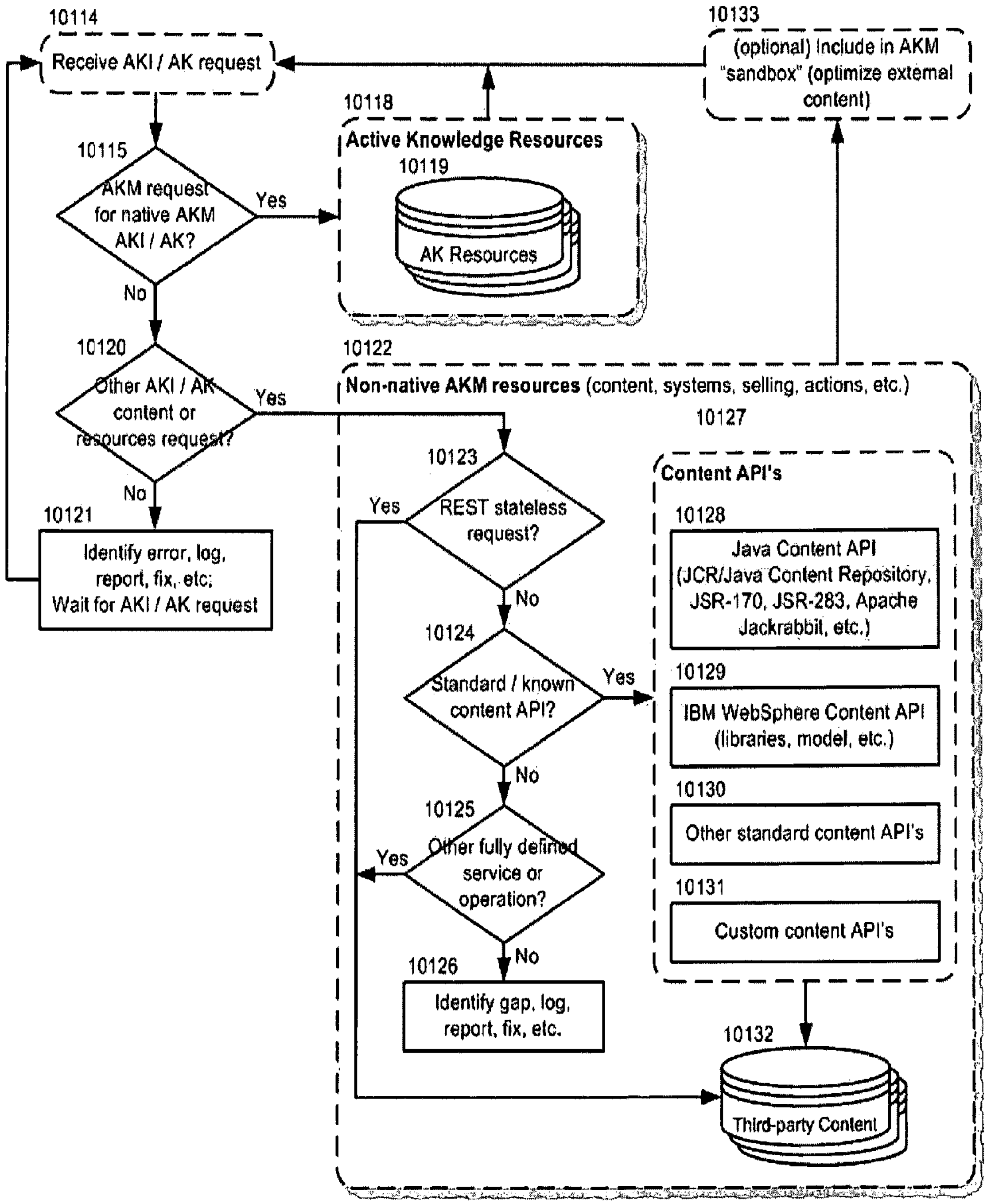

FIG. 235 is a flow chart showing some examples of procedures for AKM method(s) to access non-AKM AKI/AK.

Figure 236:
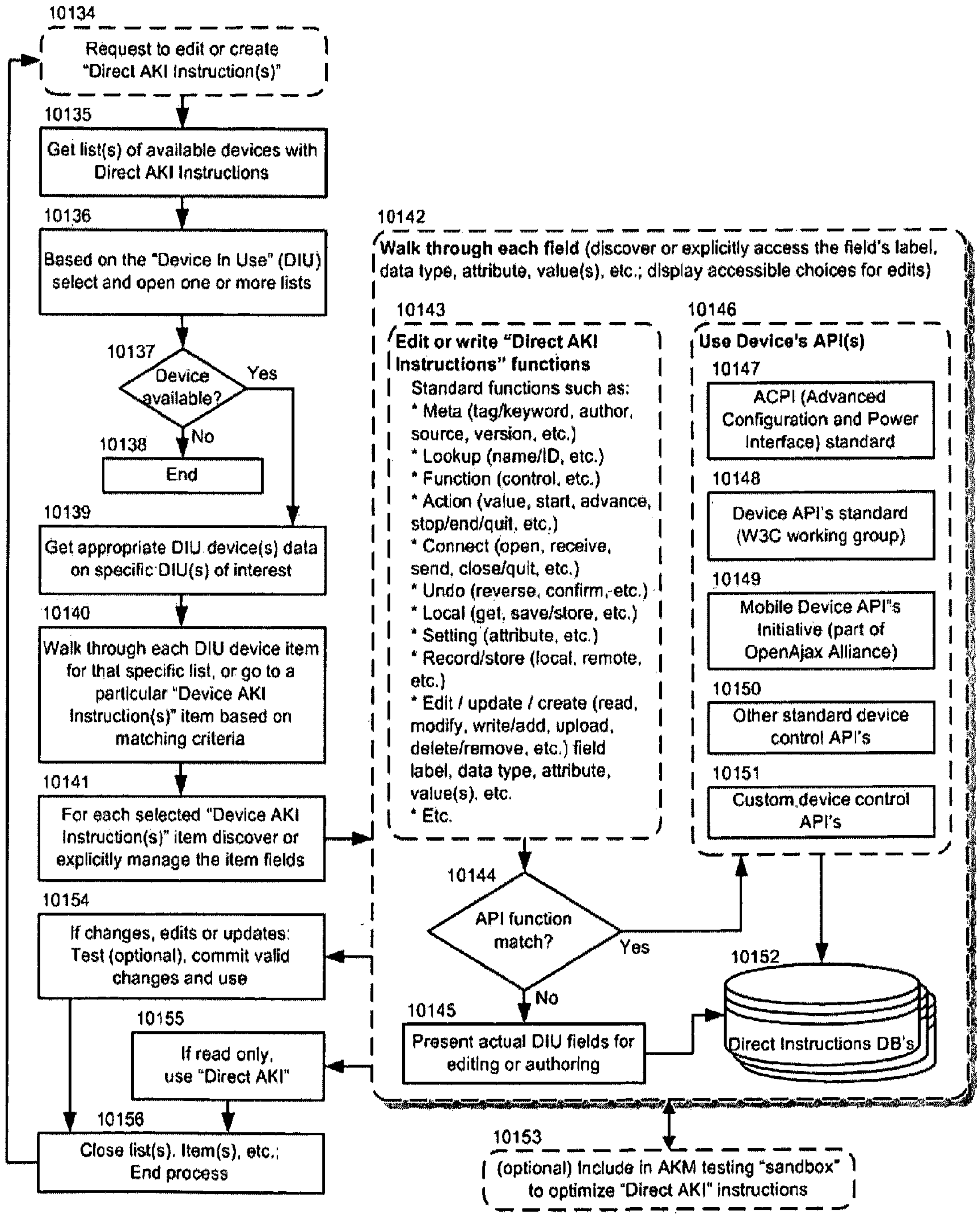

FIG. 236 is a flow chart showing some examples of procedures for AKM API(s) for creating or editing devices instructions ("direct AKI" to automate tasks).

Figure 237:
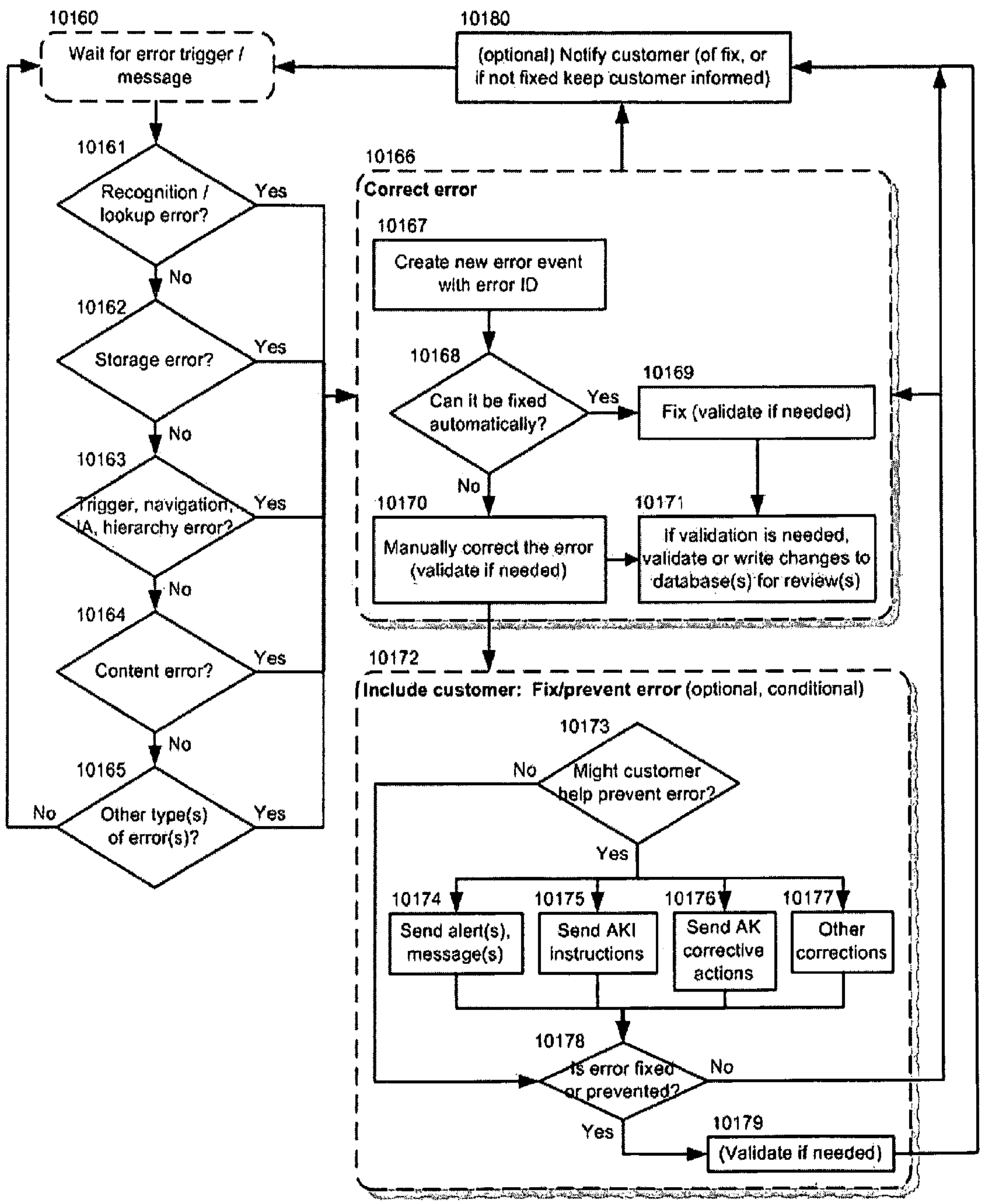

FIG. 237 is a flow chart showing some examples of procedures for AKM content or error management.

Figure 238:
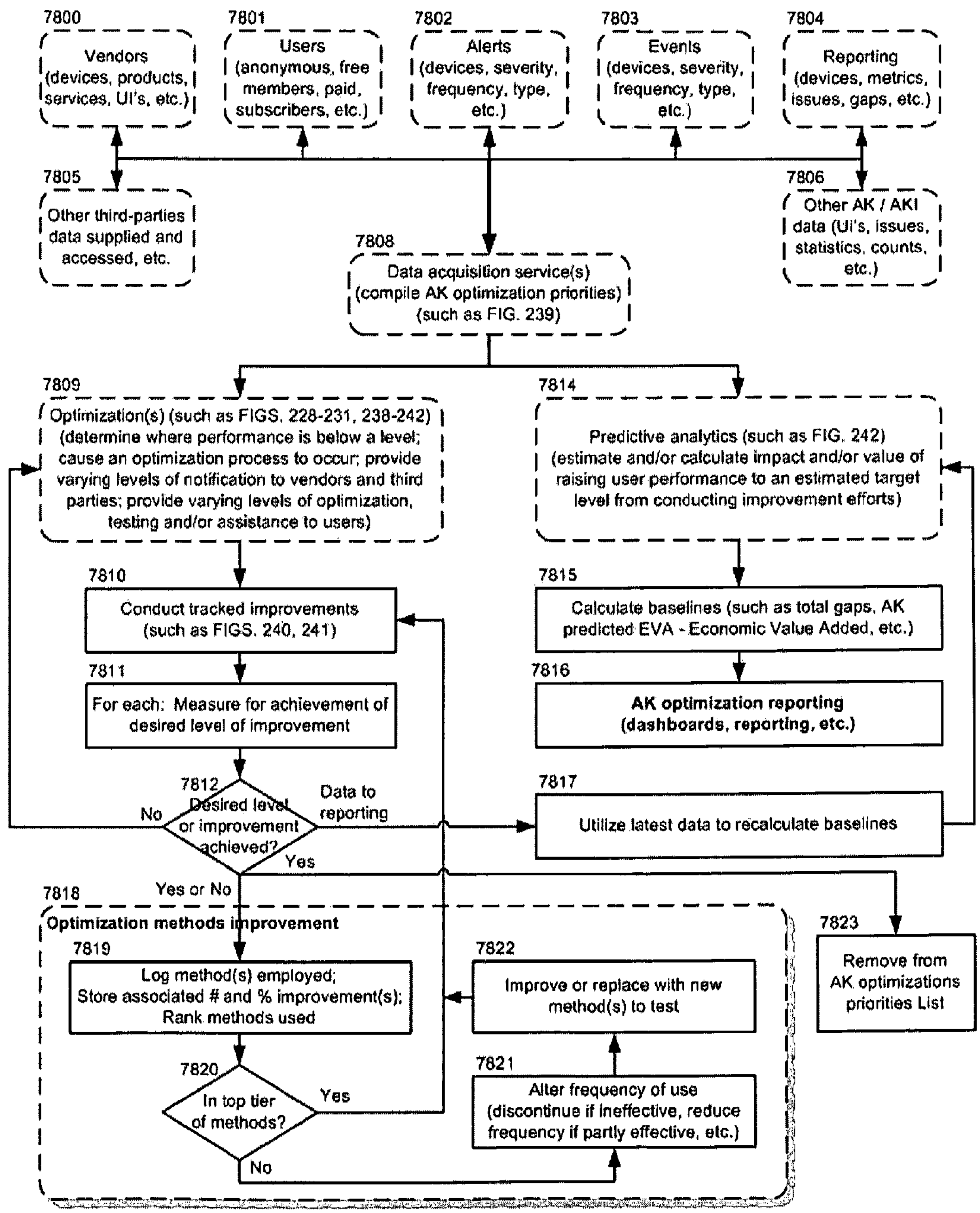

FIG. 238 is a flow chart showing some examples of procedures for an AKM optimizations ecosystem.

Figure 239:
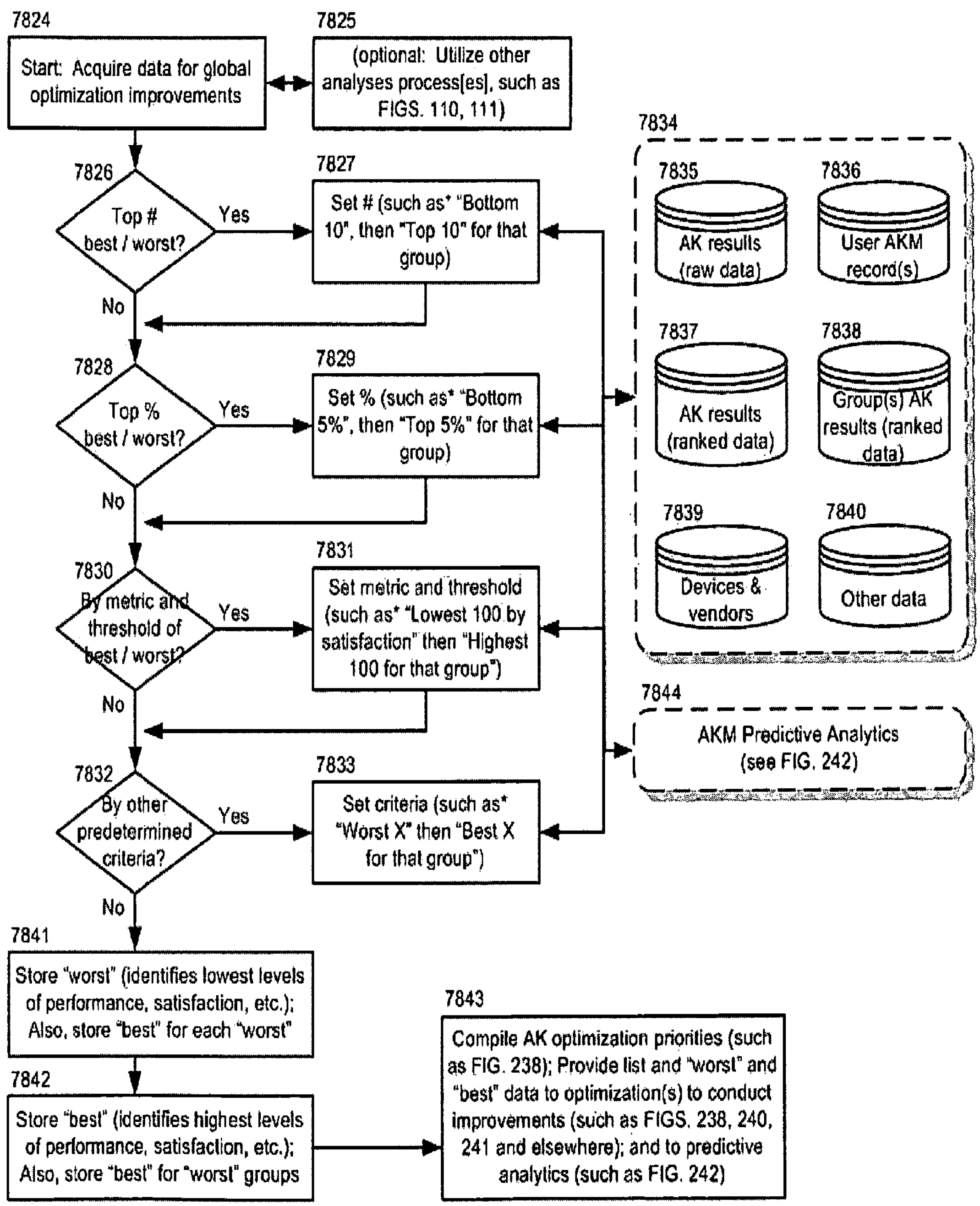

FIG. 239 is a flow chart showing some examples of procedures for some outputs of an AKM optimizations ecosystem, such as identifying and making visible "best" and "worst" choices based on actual behavior and use.

Figure 240:
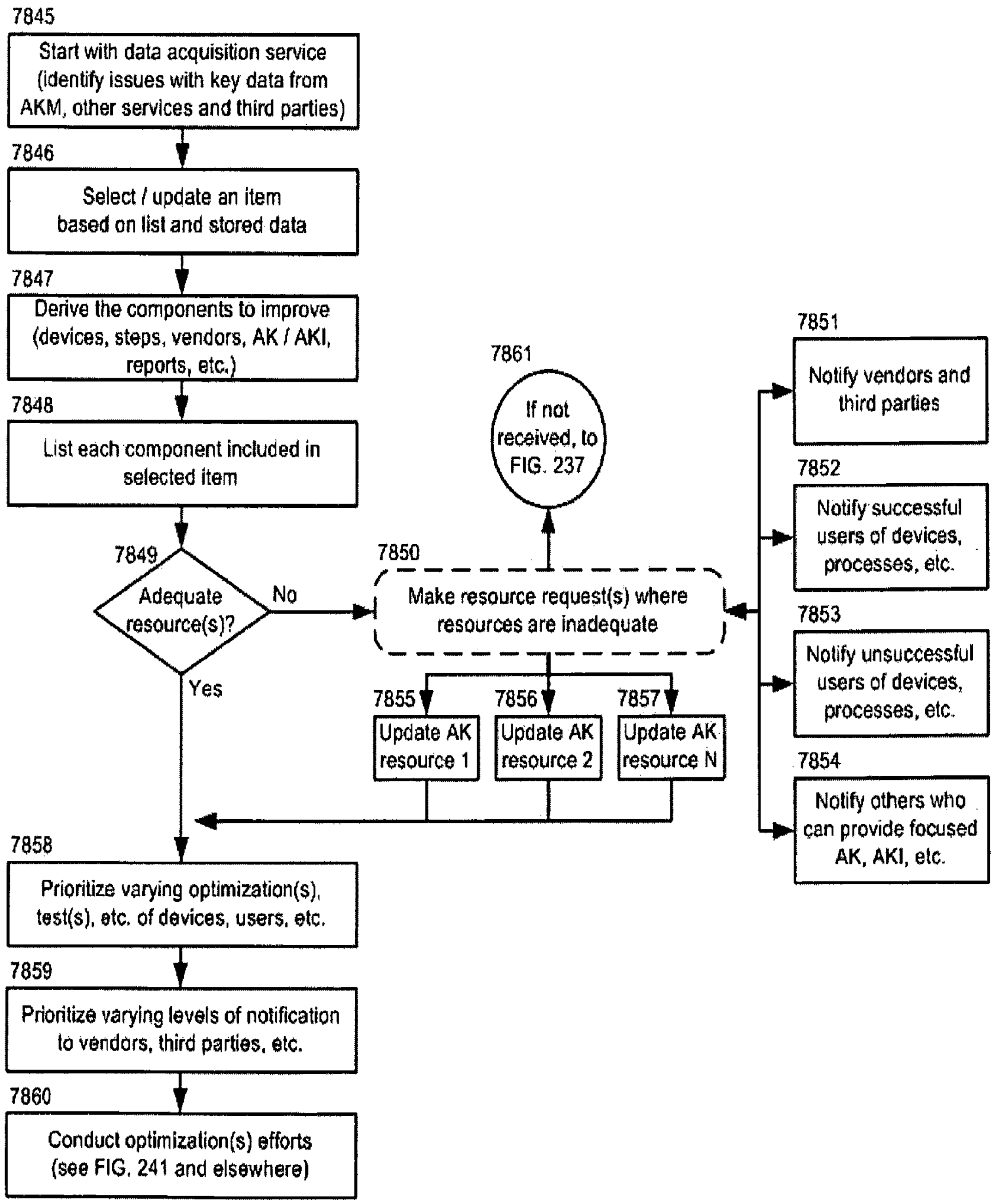

FIG. 240 is a flow chart showing some examples of resources for data acqusition in AKM optimizations ecosystem.

Figure 241:
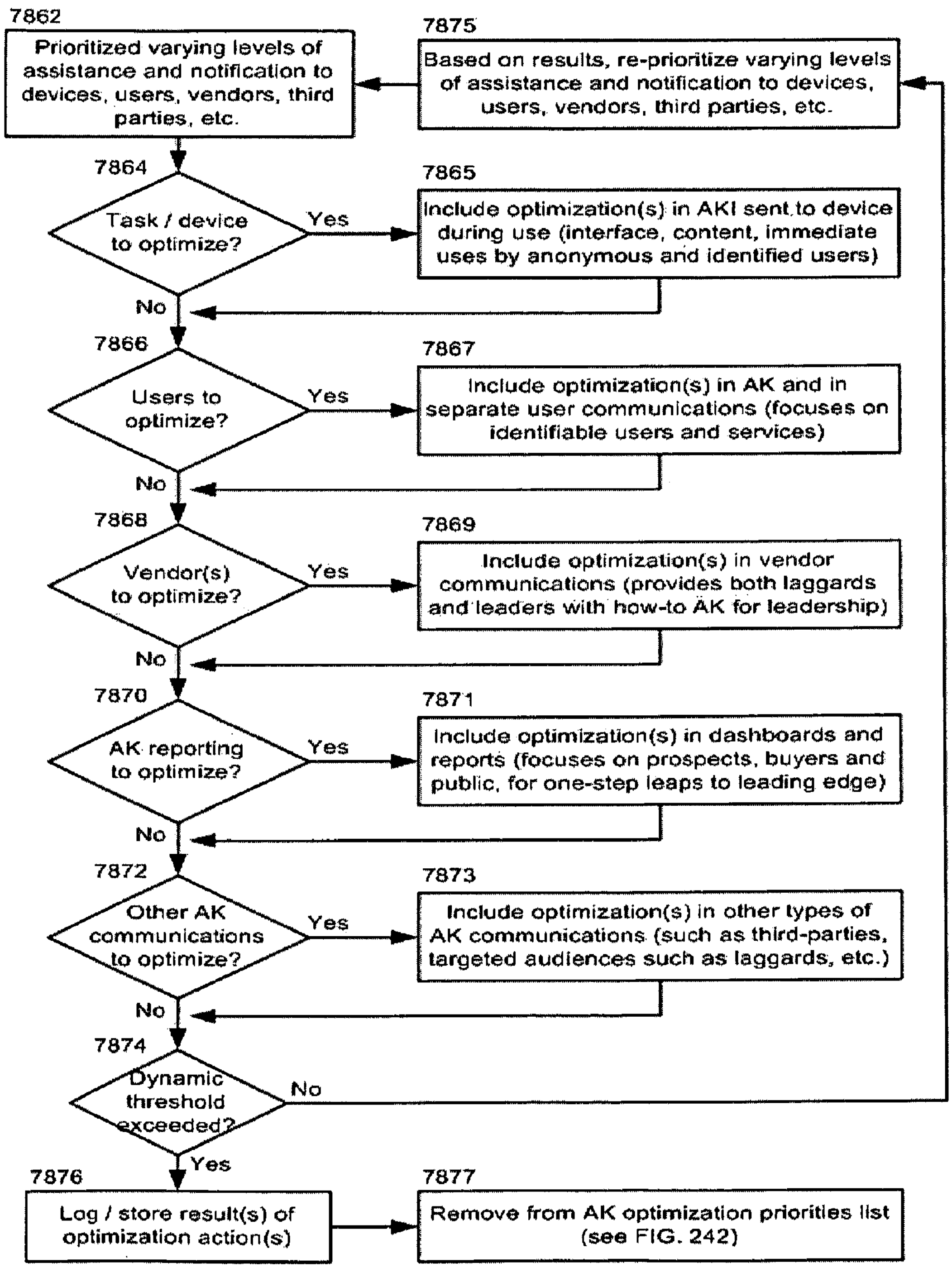

FIG. 241 is a flow chart showing some example areas and some example options for conducting AKM optimizations.

Figure 242:
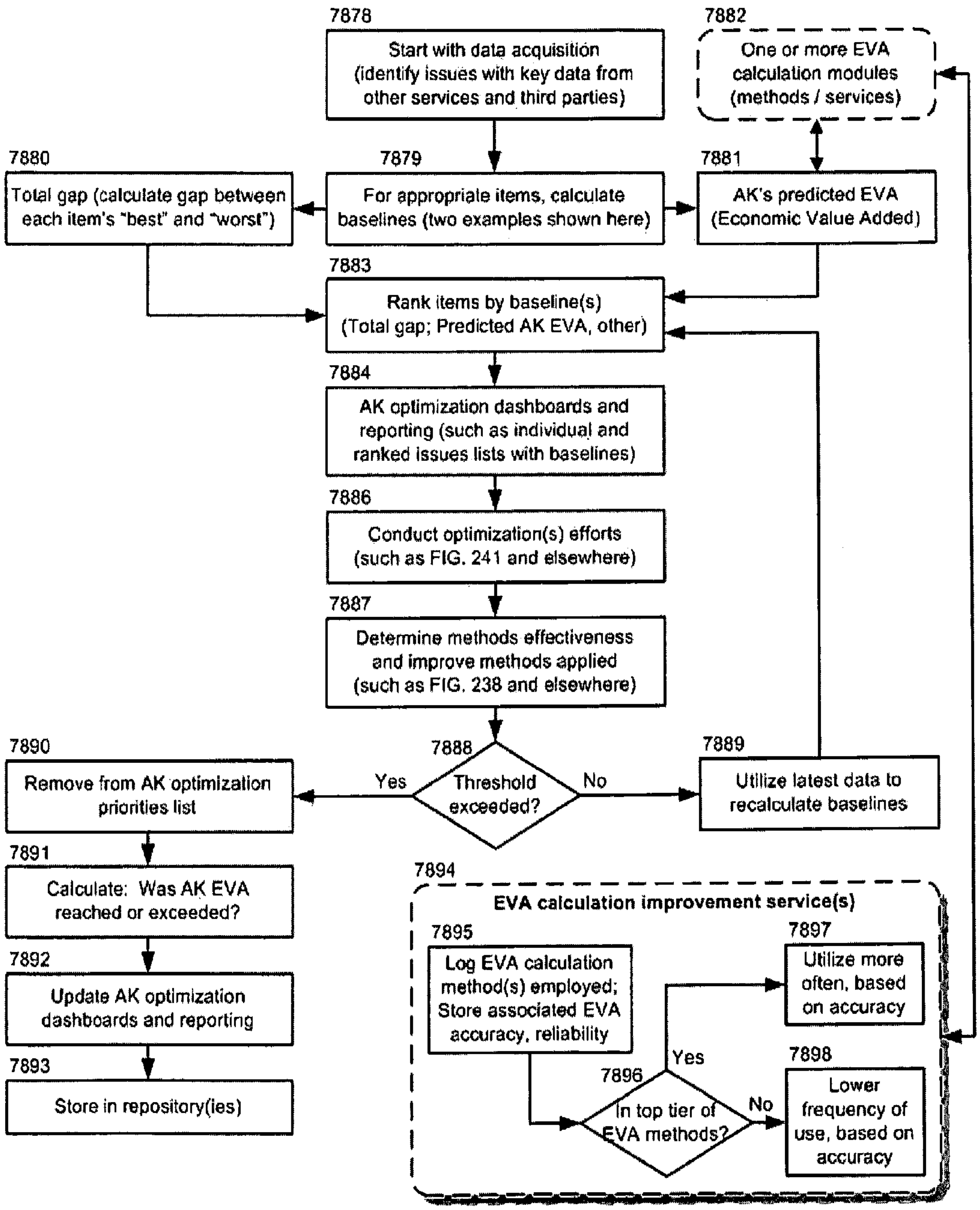

FIG. 242 is a flow chart showing some examples of procedures for AKM predictive analytics, including Economic Value Added (EVA) estimates.

Figure 243:
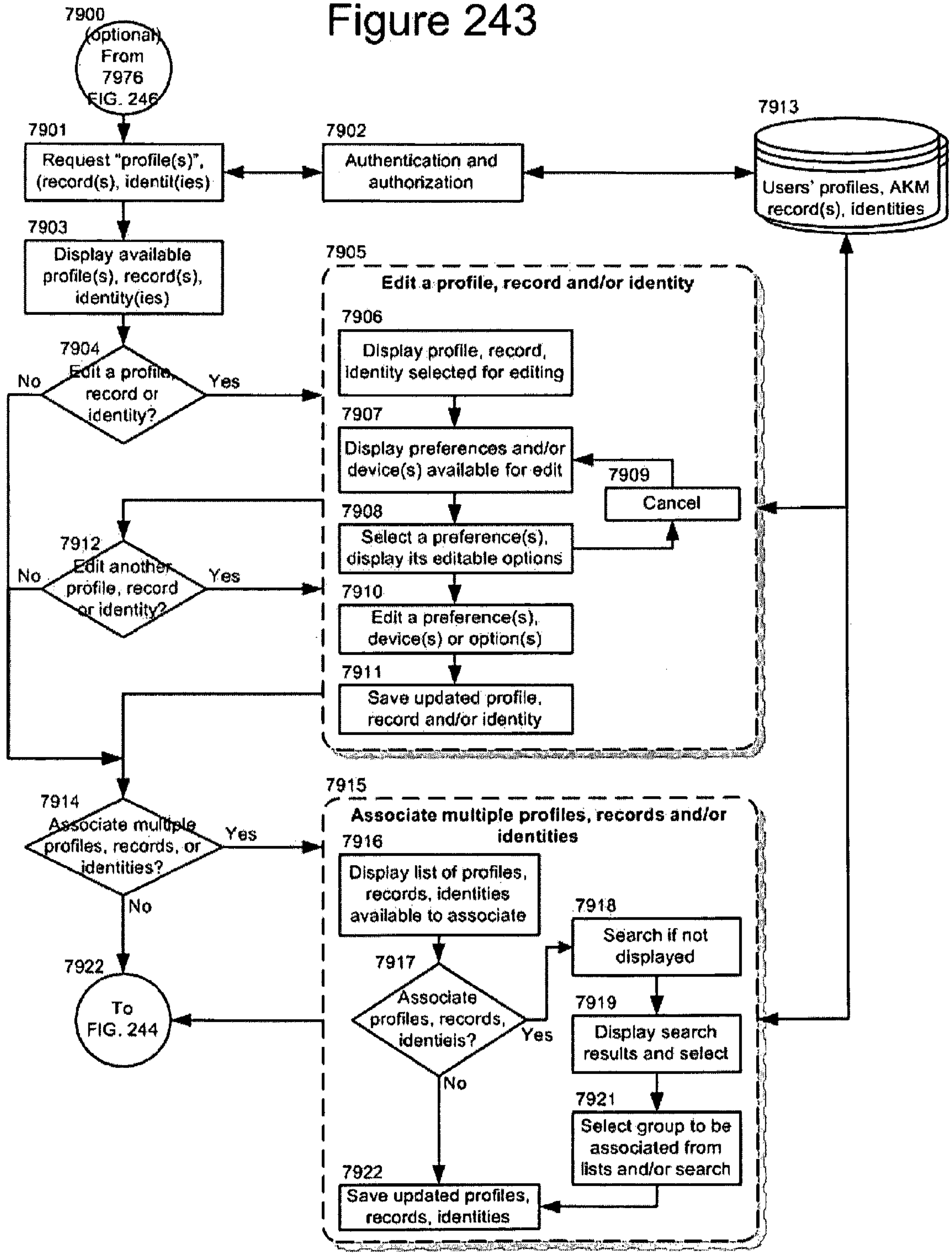

FIG. 243 is a flow chart showing some examples of procedures for editing and/or associating user(s), vendor and/or Governances profile(s), record(s) and identity(ies) management.

Figure 244:
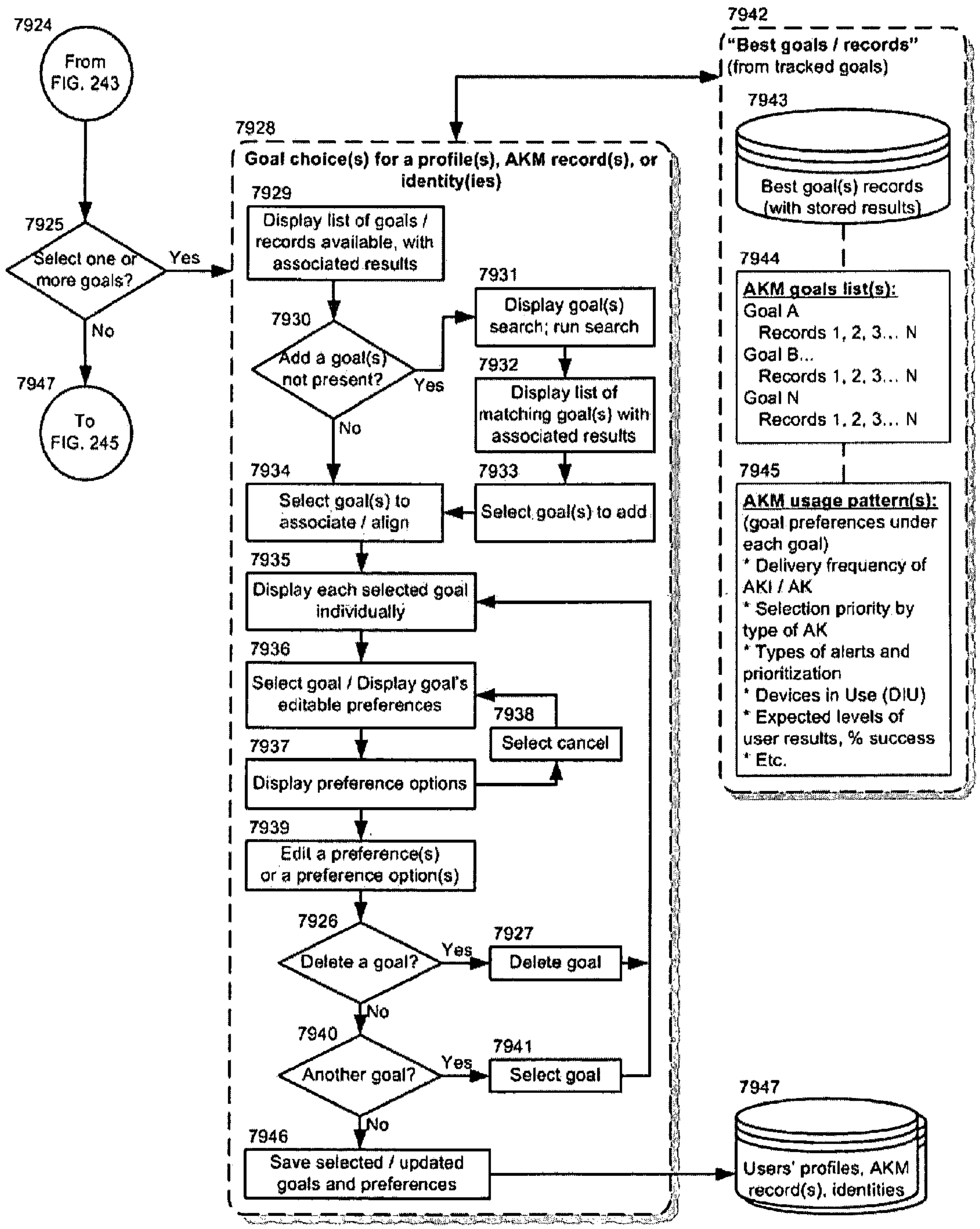

FIG. 244 is a flow chart showing some examples of procedures for AKM goal(s) self-service controls.

Figure 245:
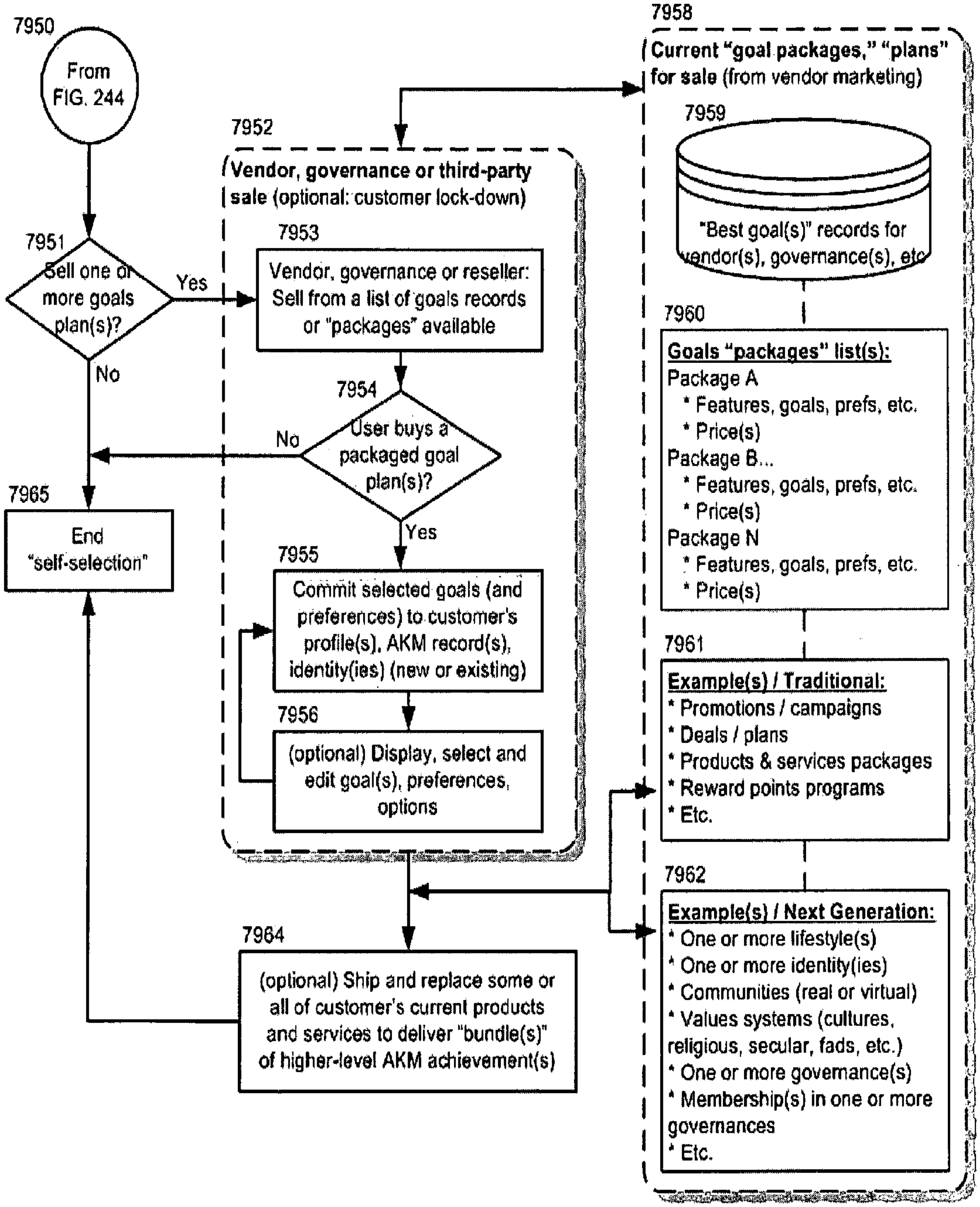

FIG. 245 is a flow chart showing some examples of procedures for vendor and/or Governances "packages" sales that include AKM services for assured customer success.

Figure 246:
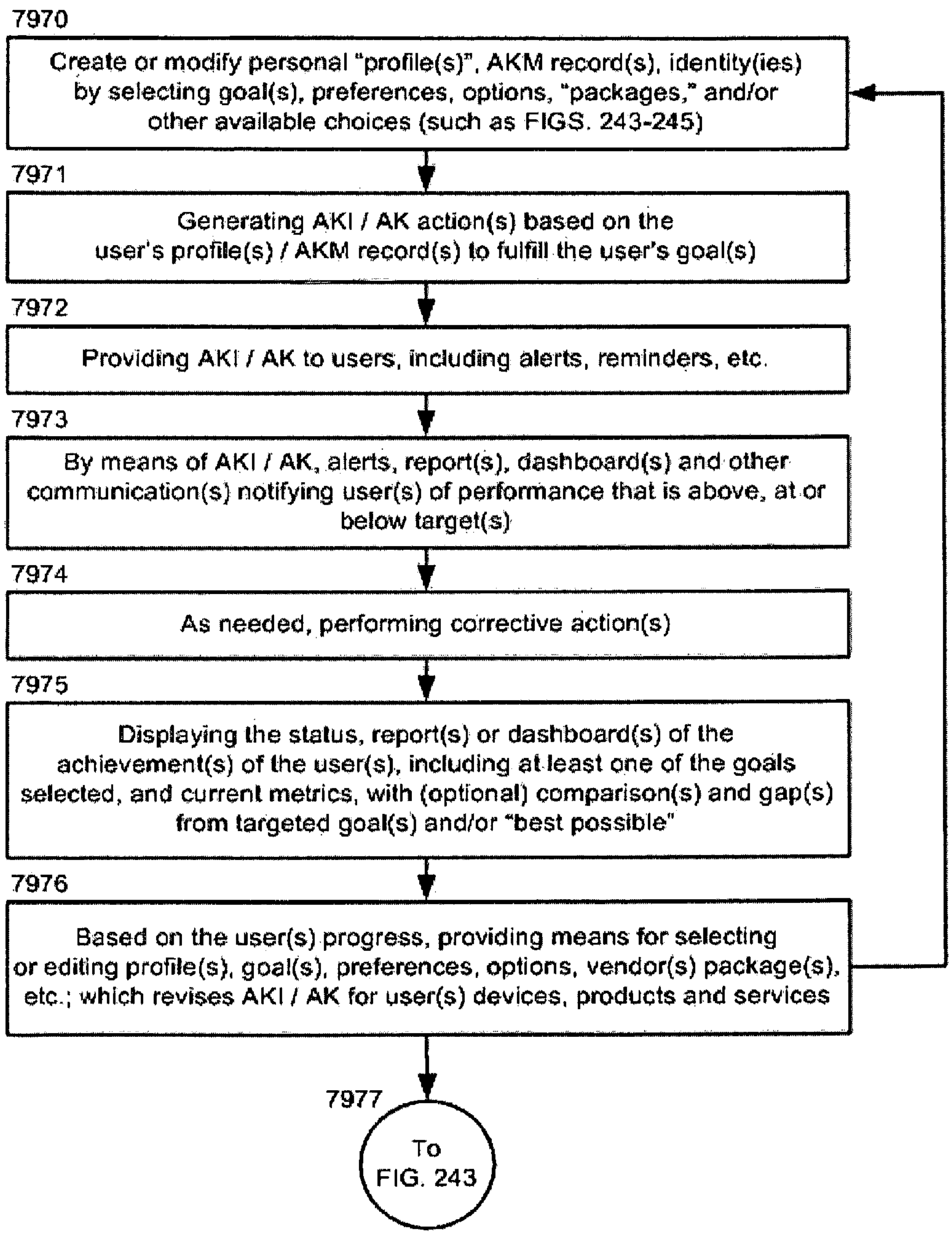

FIG. 246 is a flow chart showing some examples of procedures for AKM continuous visibility of success/failure by goals/"packages" customers.

Figure 247:
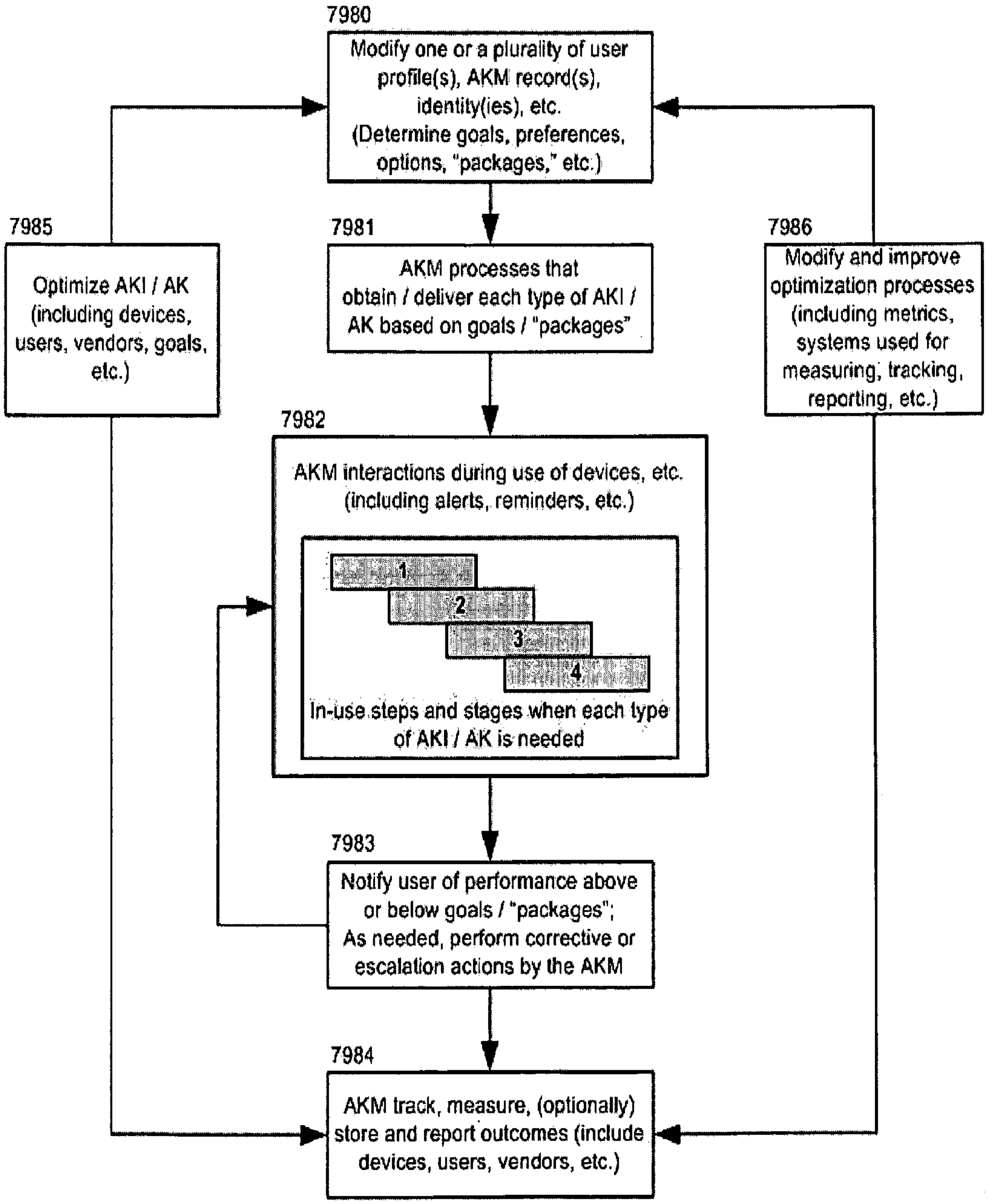

FIG. 247 is a block diagram illustrating some examples of AKM tracking and measurement of success/failure by goals/"packages" customers, and AKM optimizations and improvements based on results.

Figure 248:
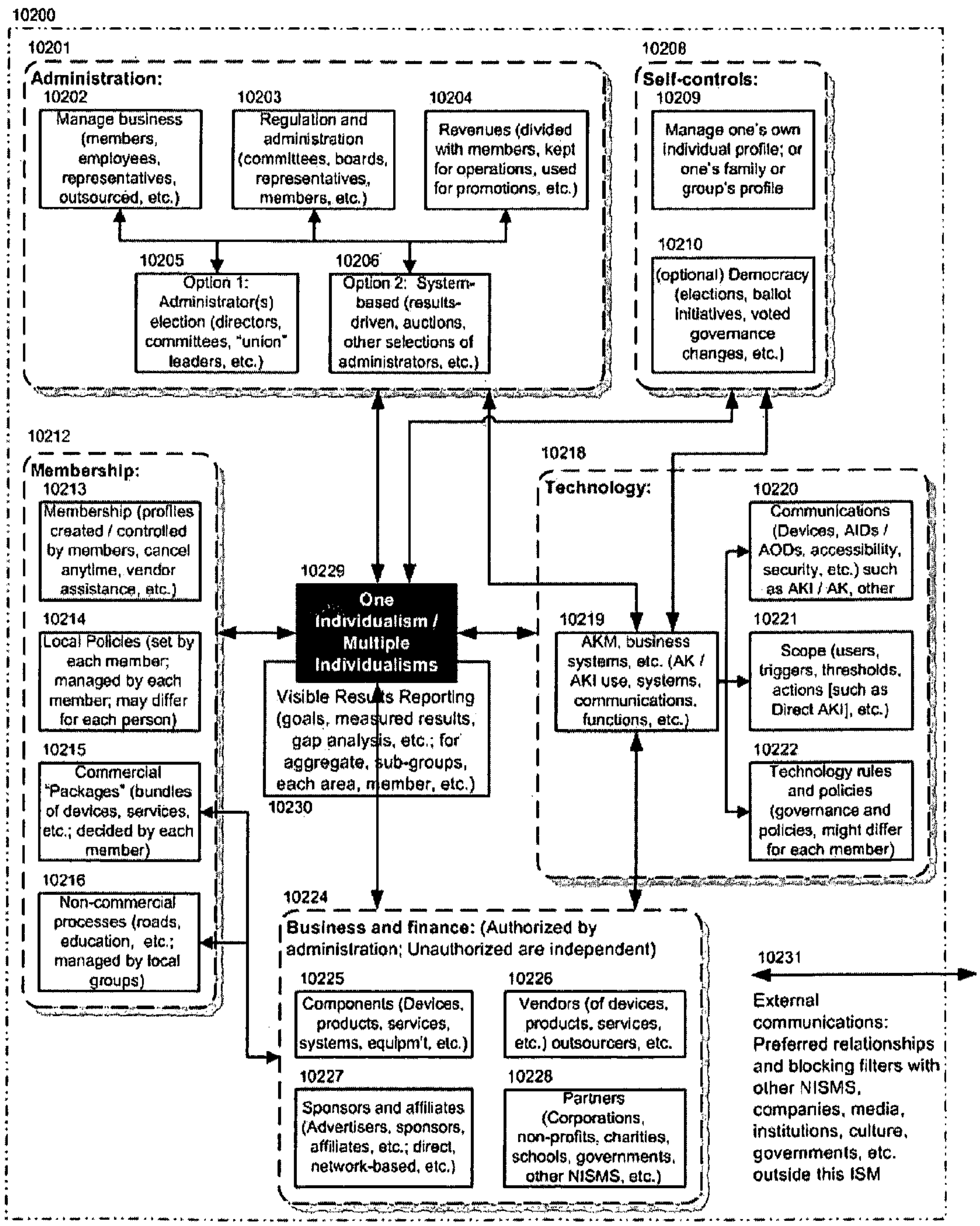

FIG. 248 is a flow chart showing some examples of a Governance(s) for individuals, herein an "IndividualISM" that supports personalized and decentralized self-governance (s).

Figure 249:
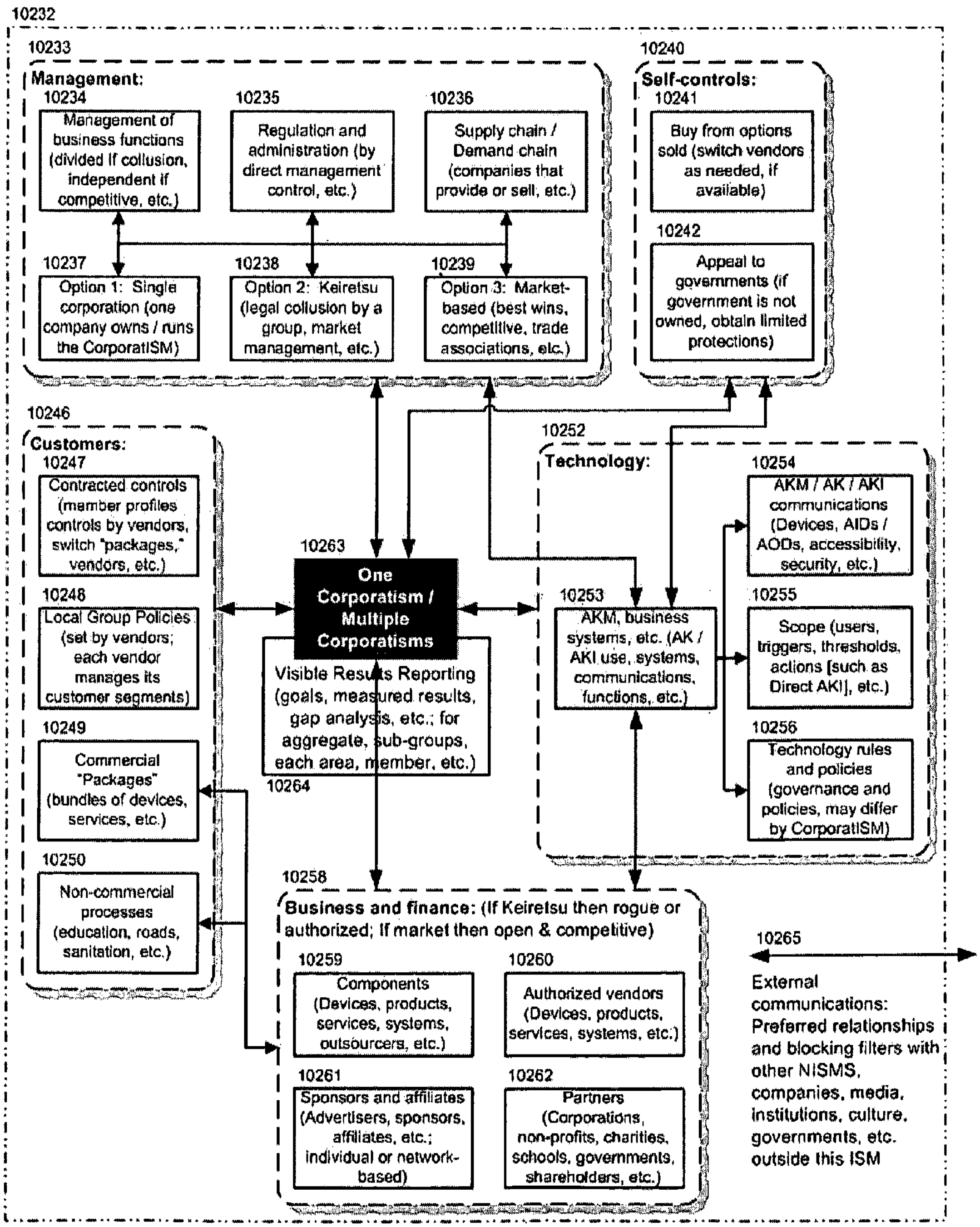

FIG. 249 is a flow chart showing some examples of a Governance(s) by corporations, herein a "CorporatISM" that supports economic lock-in at satisfying consumption levels by means of comprehensive "packages" designed to solve numerous consumer needs in single "packages" at tiered, fixed prices.

Figure 250:
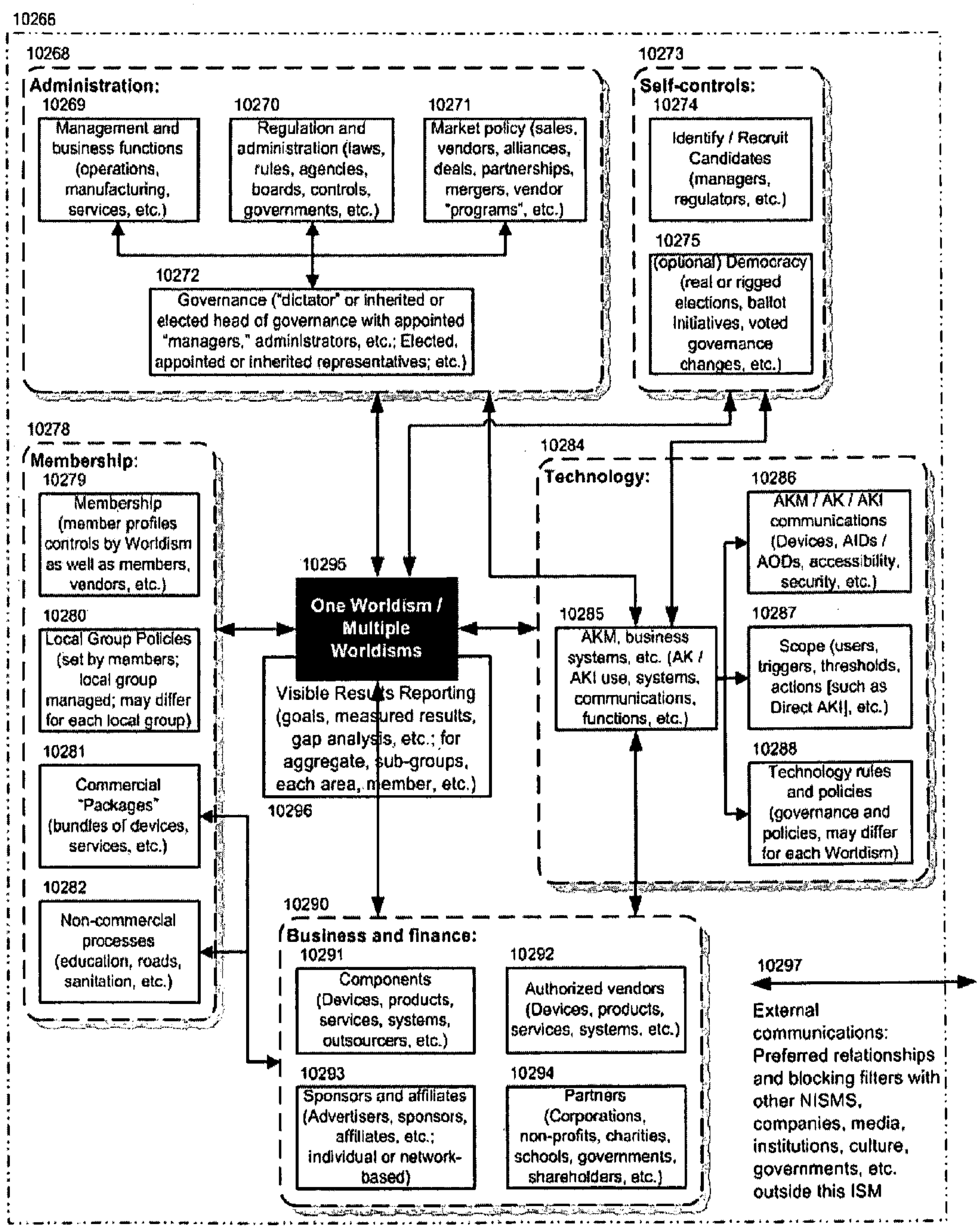

FIG. 250 is a flow chart showing some examples of a Governance(s) for groups, herein a "WorldISM" that is centralized, trans-border and supports collective actions in broad areas such as environmentalism, health, humanitarianism, religion and ethnicity.

Figure 251:
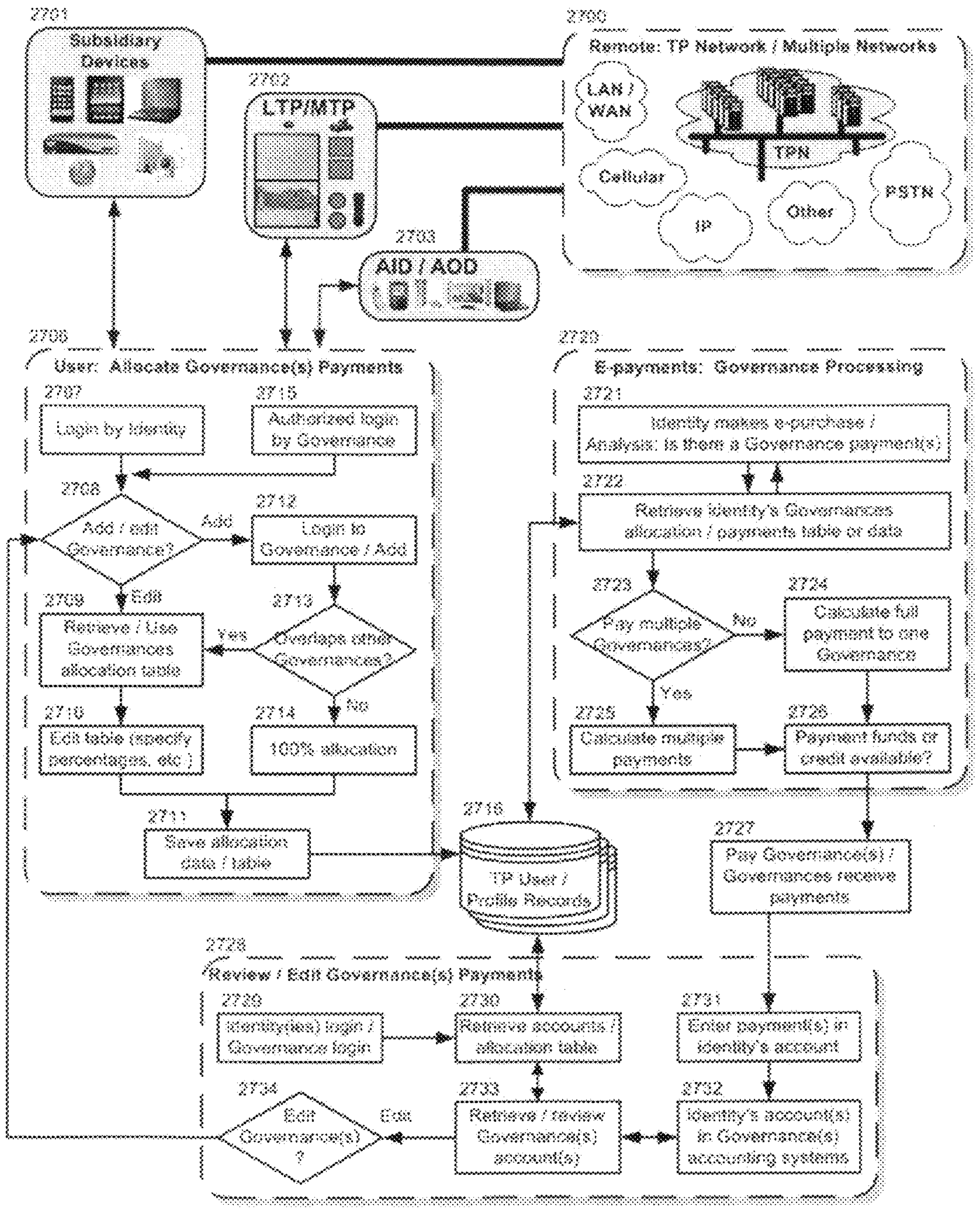

FIG. 251 is a flow chart showing some examples of procedures for a Governances revenue system (GRS), providing in some examples self-determined means to automatically support one or more Governances financially, in some examples with control by individuals who can slow or stop funding if a Governance is ineffective or fails to produce results.

Figure 252:
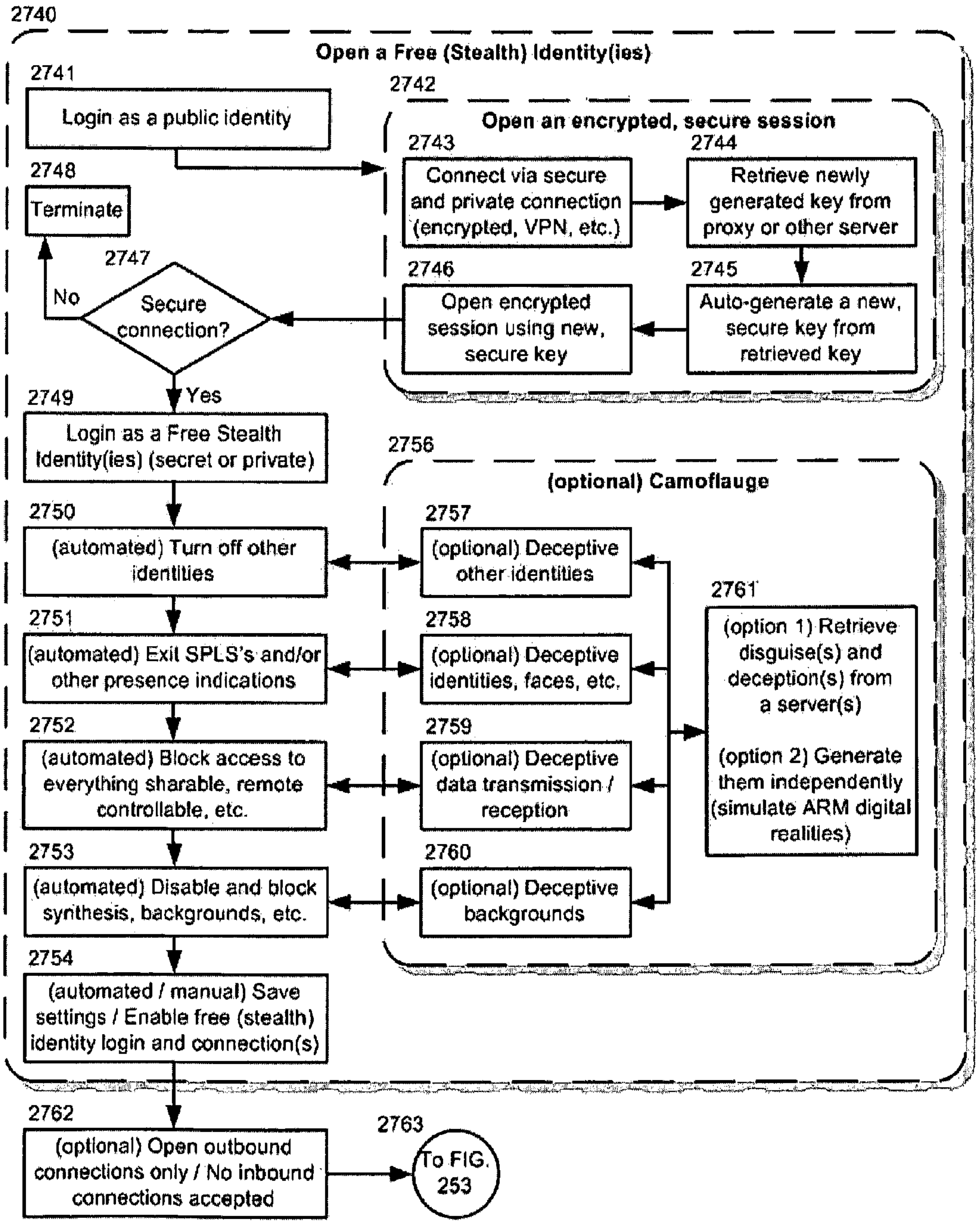

FIG. 252 is a flow chart showing some examples of some procedures for a freedom from dictatorships system—opening a free (stealth) identity's communications.

Figure 253:
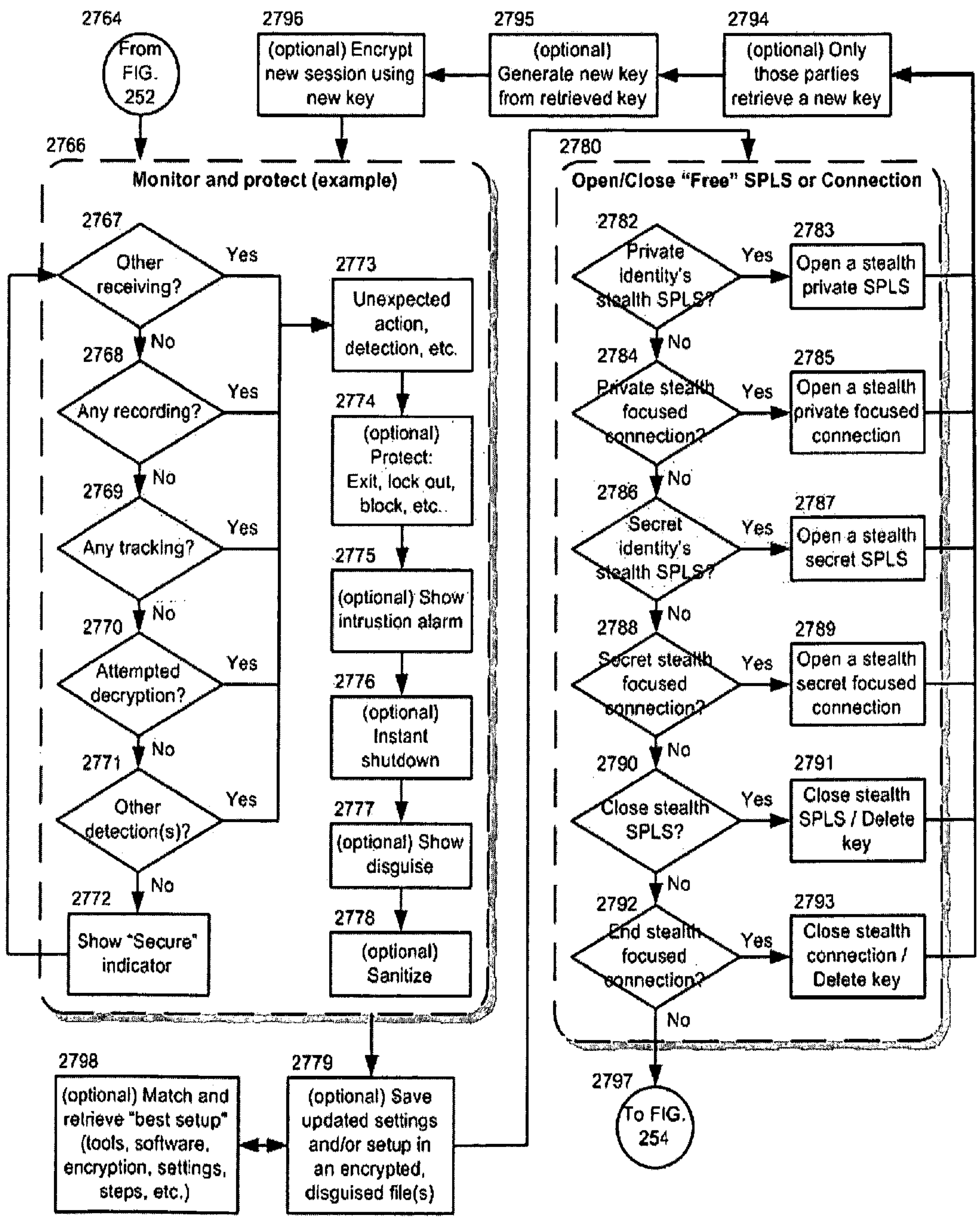

FIG. 253 is a flow chart showing some examples of some procedures for a freedom from dictatorships system—monitoring and protecting a free (stealth) identity's communications, and opening and closing a free identity's (stealth) SPLS's and/or connections.

Figure 254:
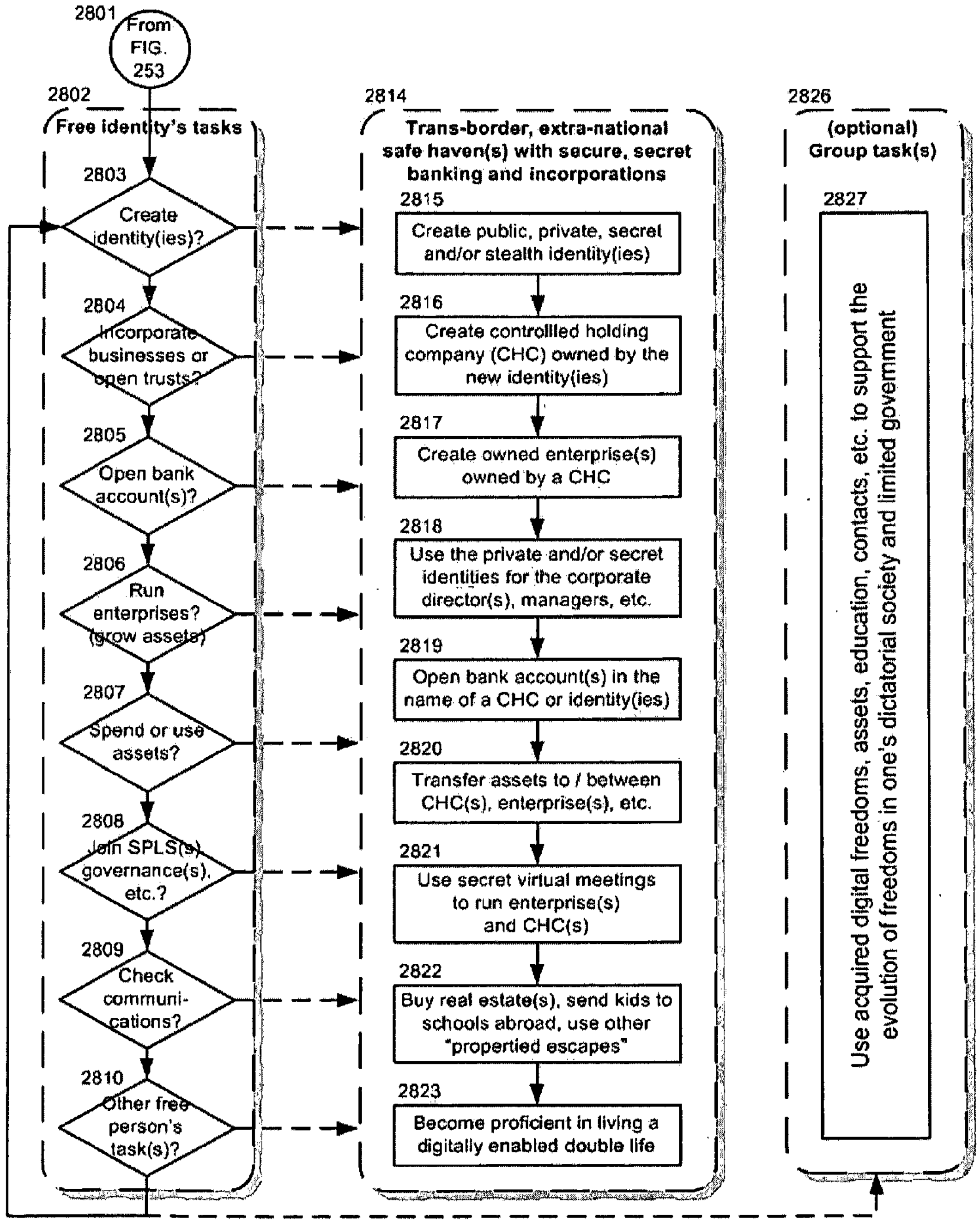

FIG. 254 is a flow chart showing some examples of some procedures for a freedom from dictatorships system—tasks performed by a free (stealth) identity outside the country in which they are oppressed.

Figure 255:
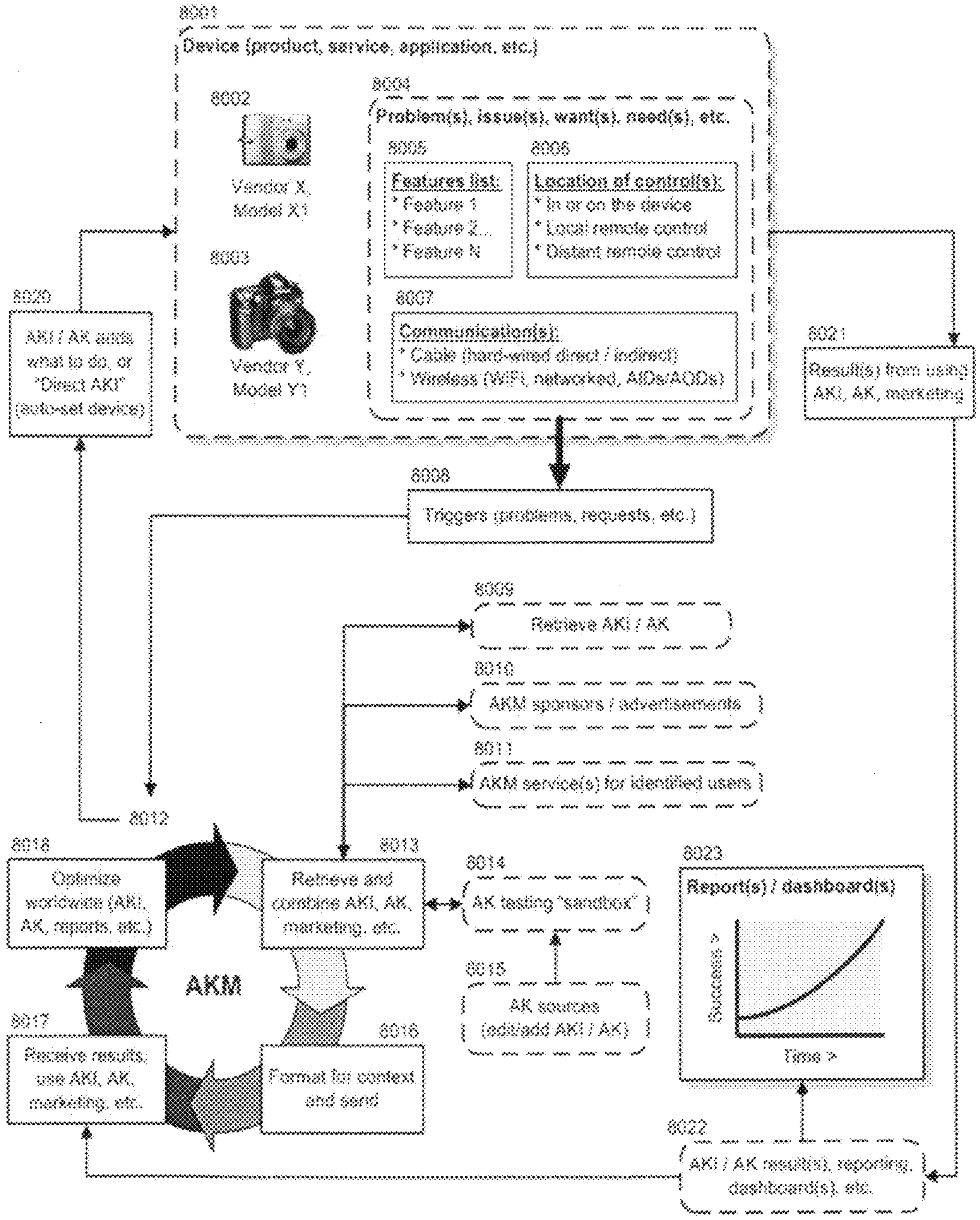

FIG. 255 is a block diagram illustrating some examples of AKM systems operating in and with photographic devices.

Figure 256:
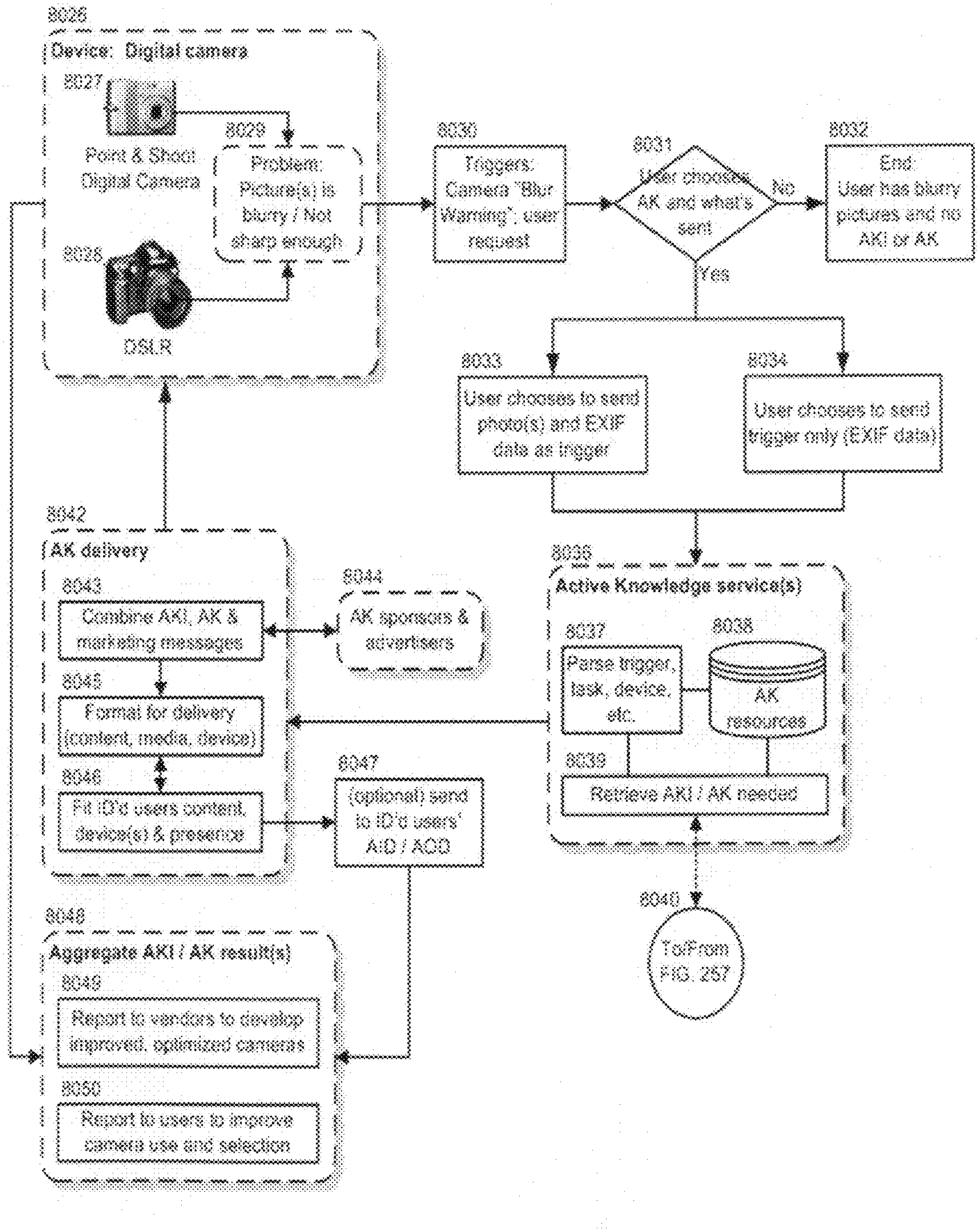

FIG. 256 is a flow chart showing some examples of some procedures for AKM initial use(s) of a device—digital camera.

Figure 257:
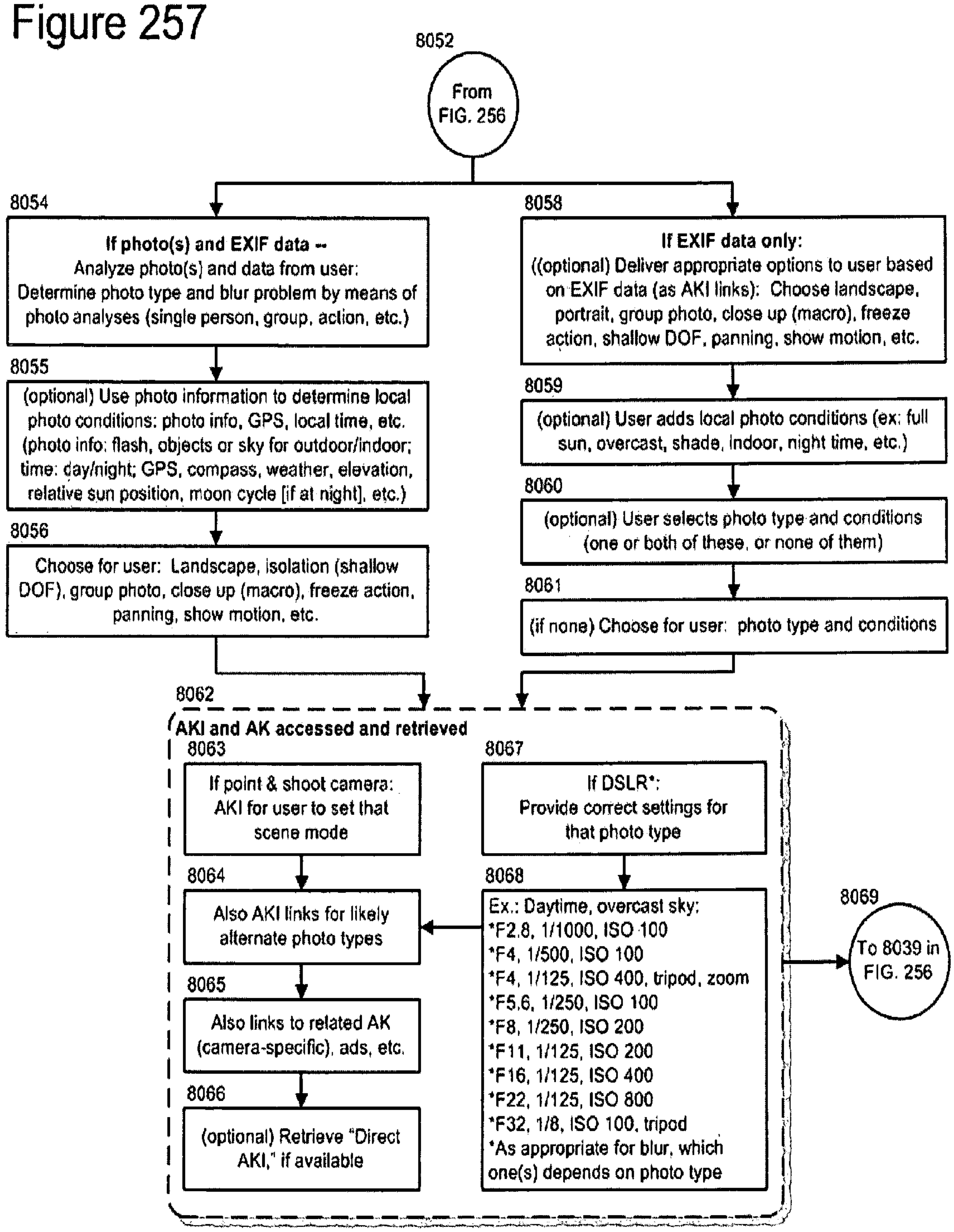

FIG. 257 is a flow chart showing some examples of some procedures for retrieving the AKI/AK needed for initial device use(s)—digital camera.

Figure 258:
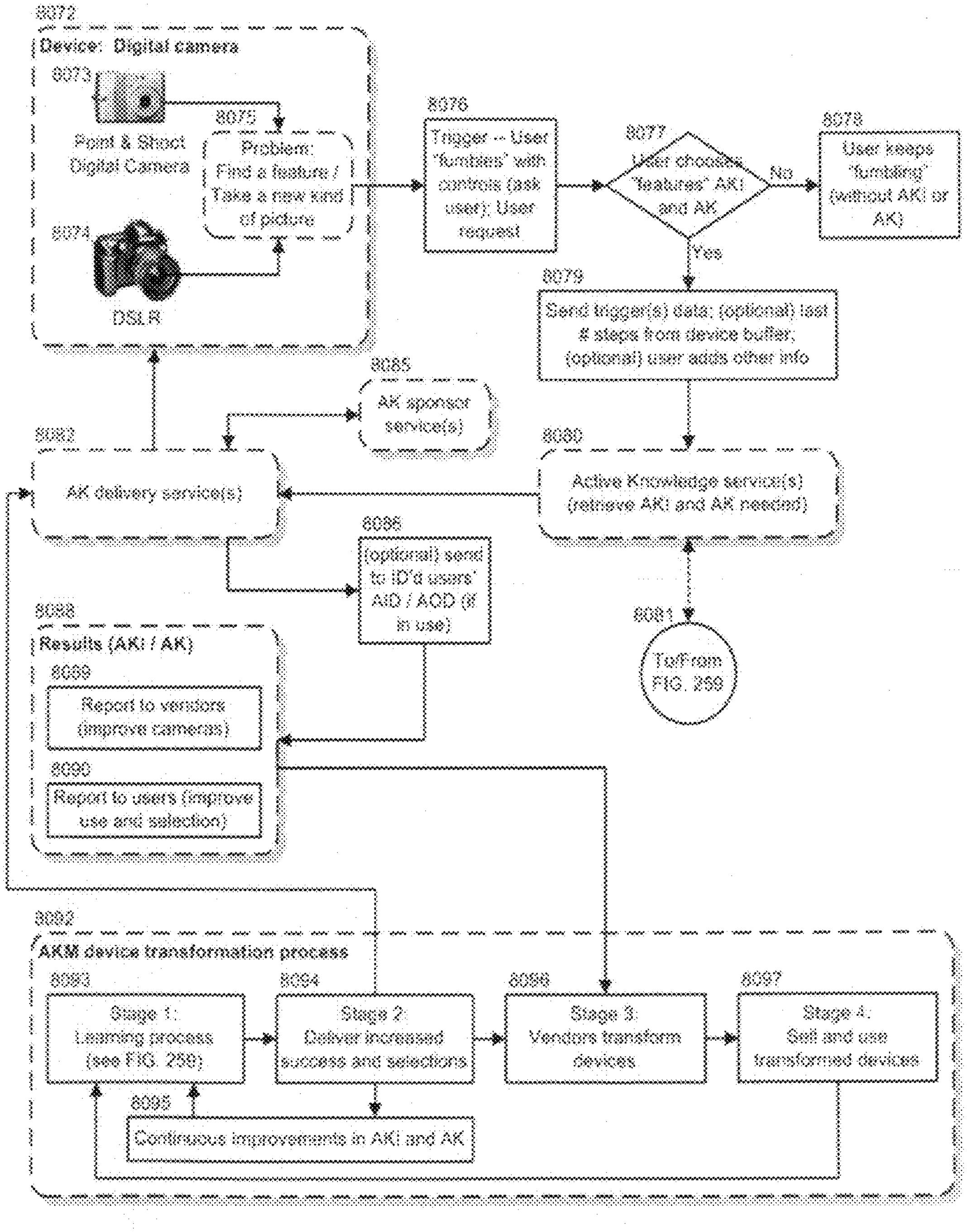

FIG. 258 is a flow chart showing some examples of some procedures for AKM new features learning in a device—digital camera.

Figure 259:
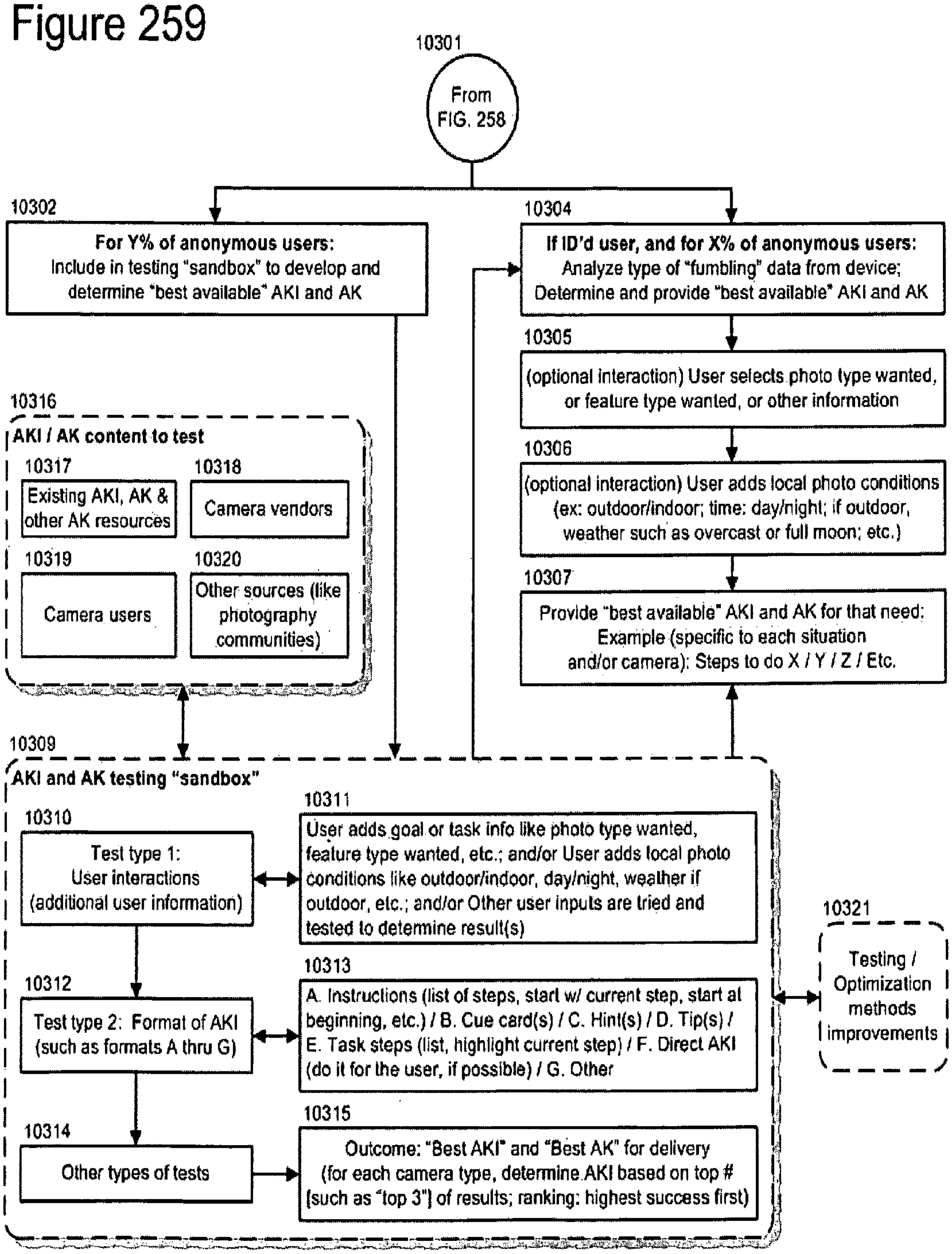

FIG. 259 is a flow chart showing some examples of some procedures for optimizations and continuous improvement of "best available" AKI/AK retrieved to continuously improve device use(s)—digital camera.

Figure 260:
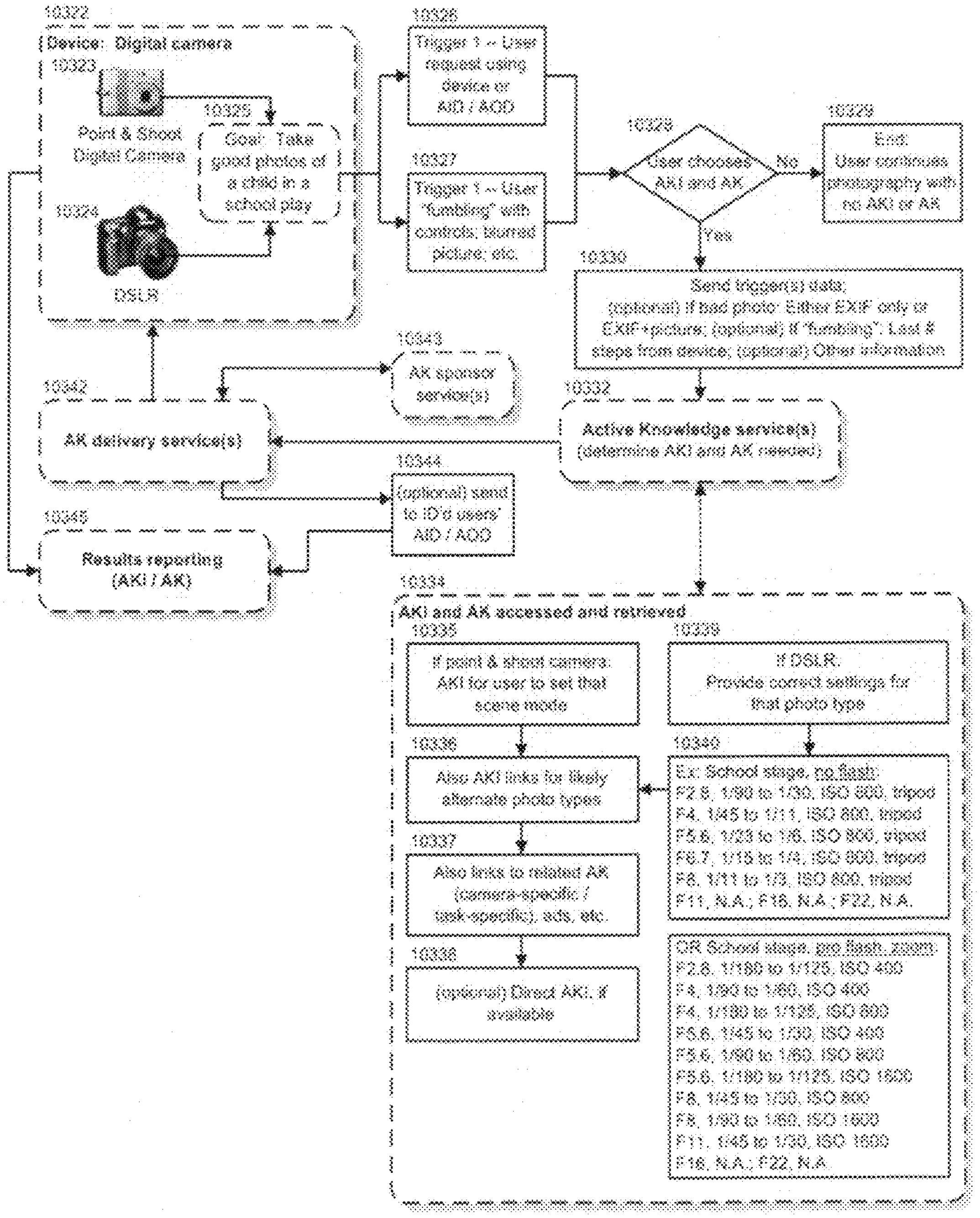

FIG. 260 is a flow chart showing some examples of some procedures for AKM domain learning from a device—digital camera.

Figure 261:
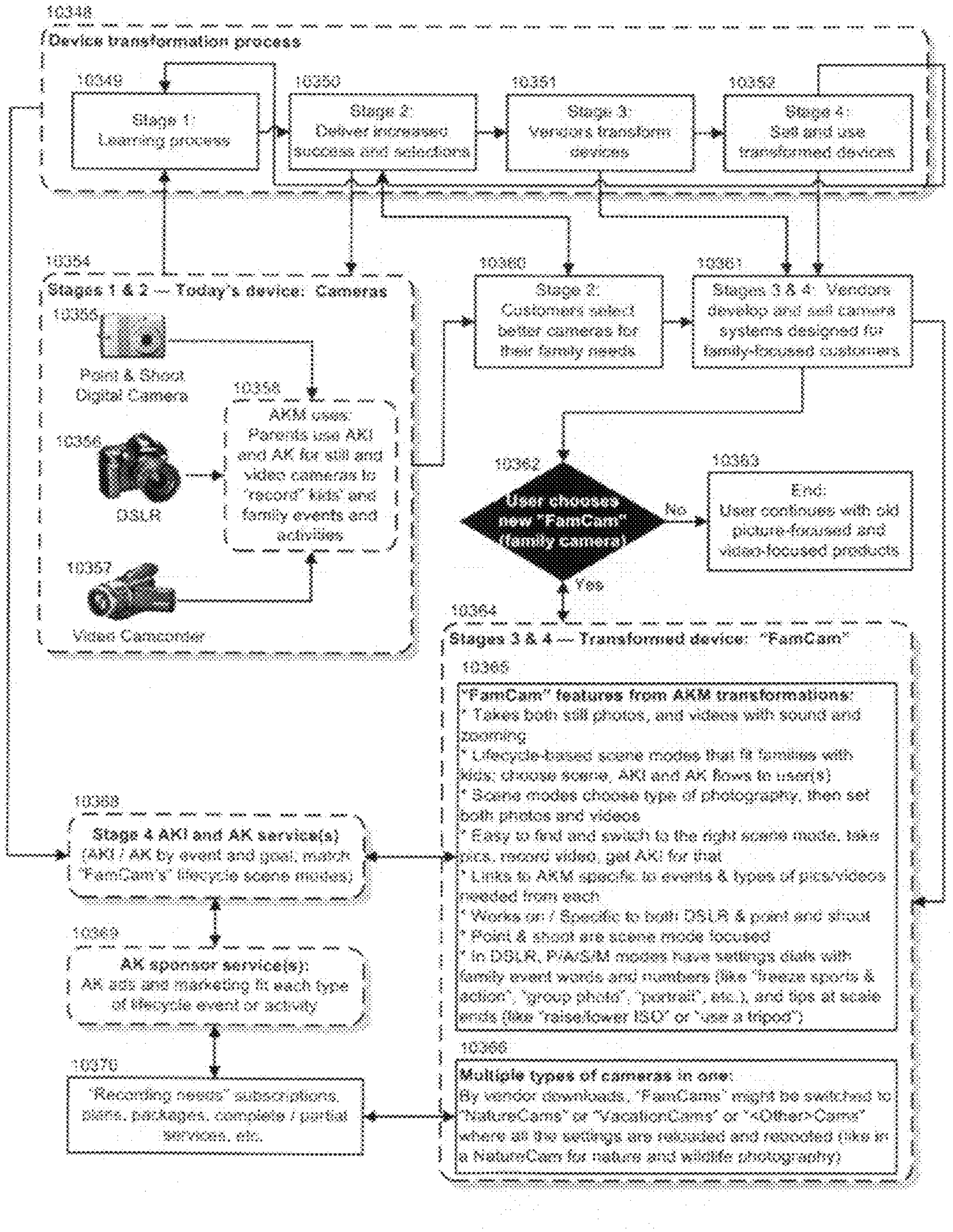

FIG. 261 is a flow chart showing some examples of some procedures for vendors to transform devices from AKM use (s)—digital camera.

Figure 262:
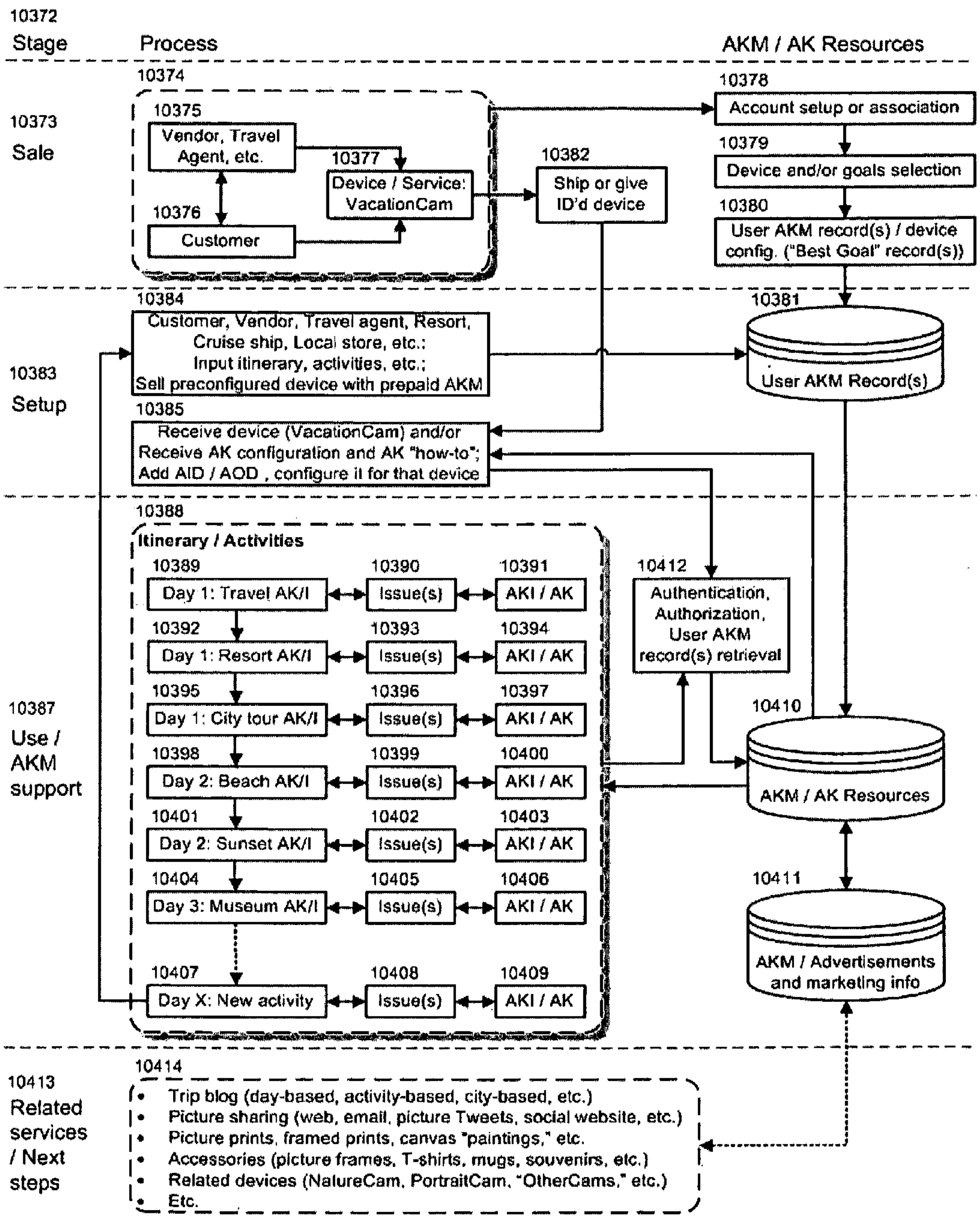

FIG. 262 is a block diagram and flow chart showing some examples of some procedures for selling and/or using a "goals package"—a digital camera as a vacation camera, or "VacationCam."

Figure 263:
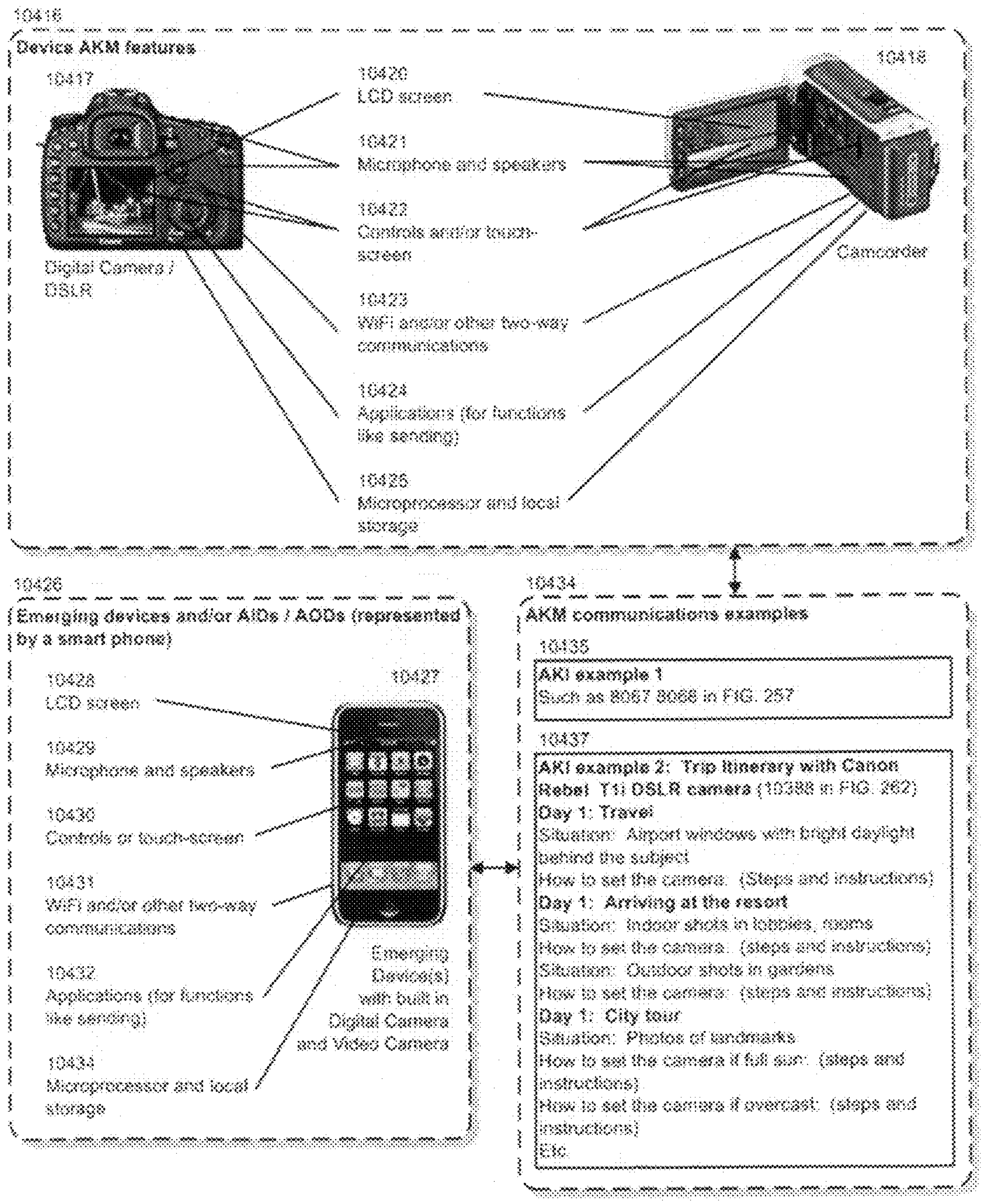

FIG. 263 is a block diagram illustrating some examples of AKM device communications—digital camera.

Figure 264:
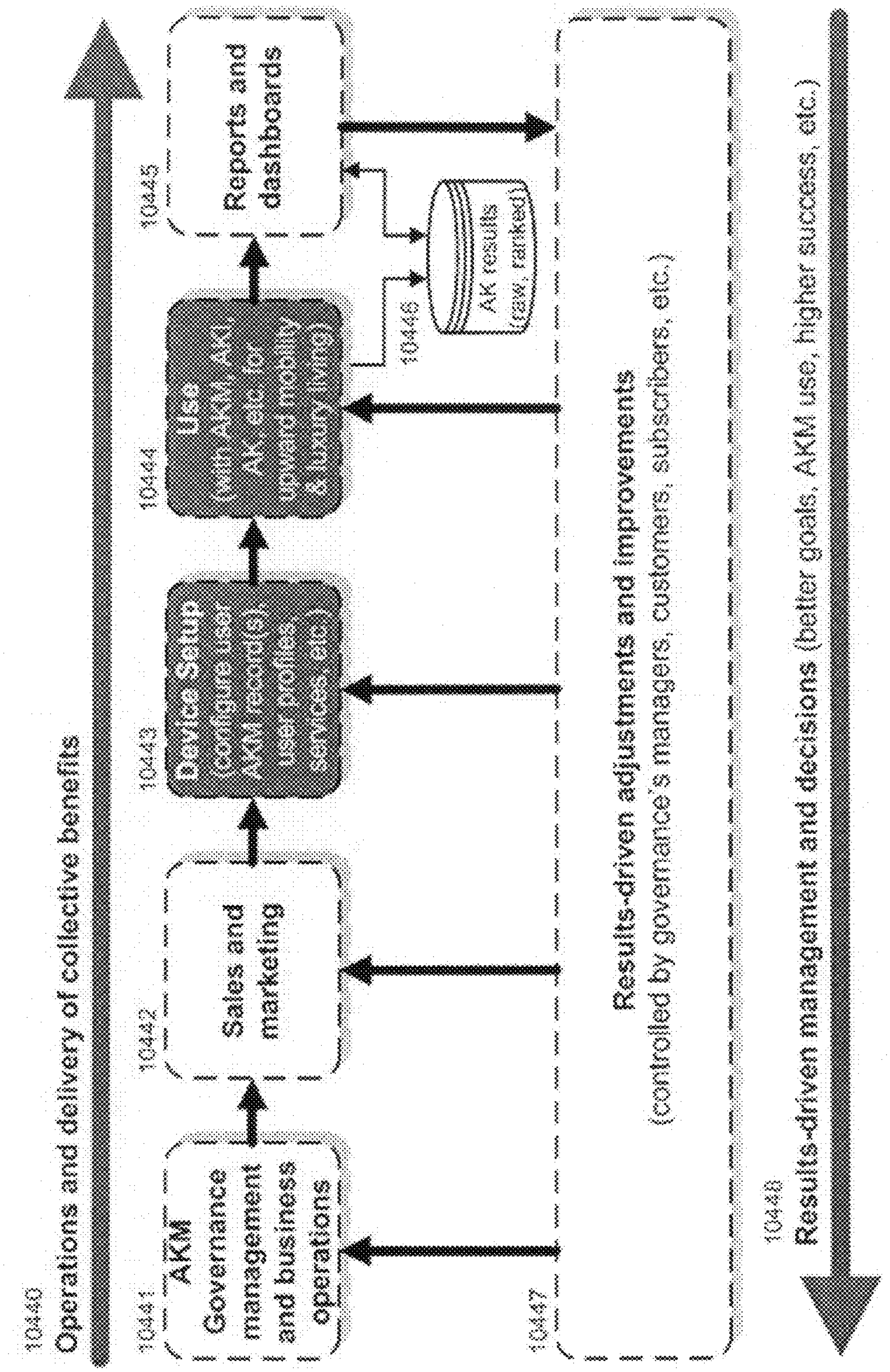

FIG. 264 is a block diagram illustrating some examples of Governances processes.

Figure 265:
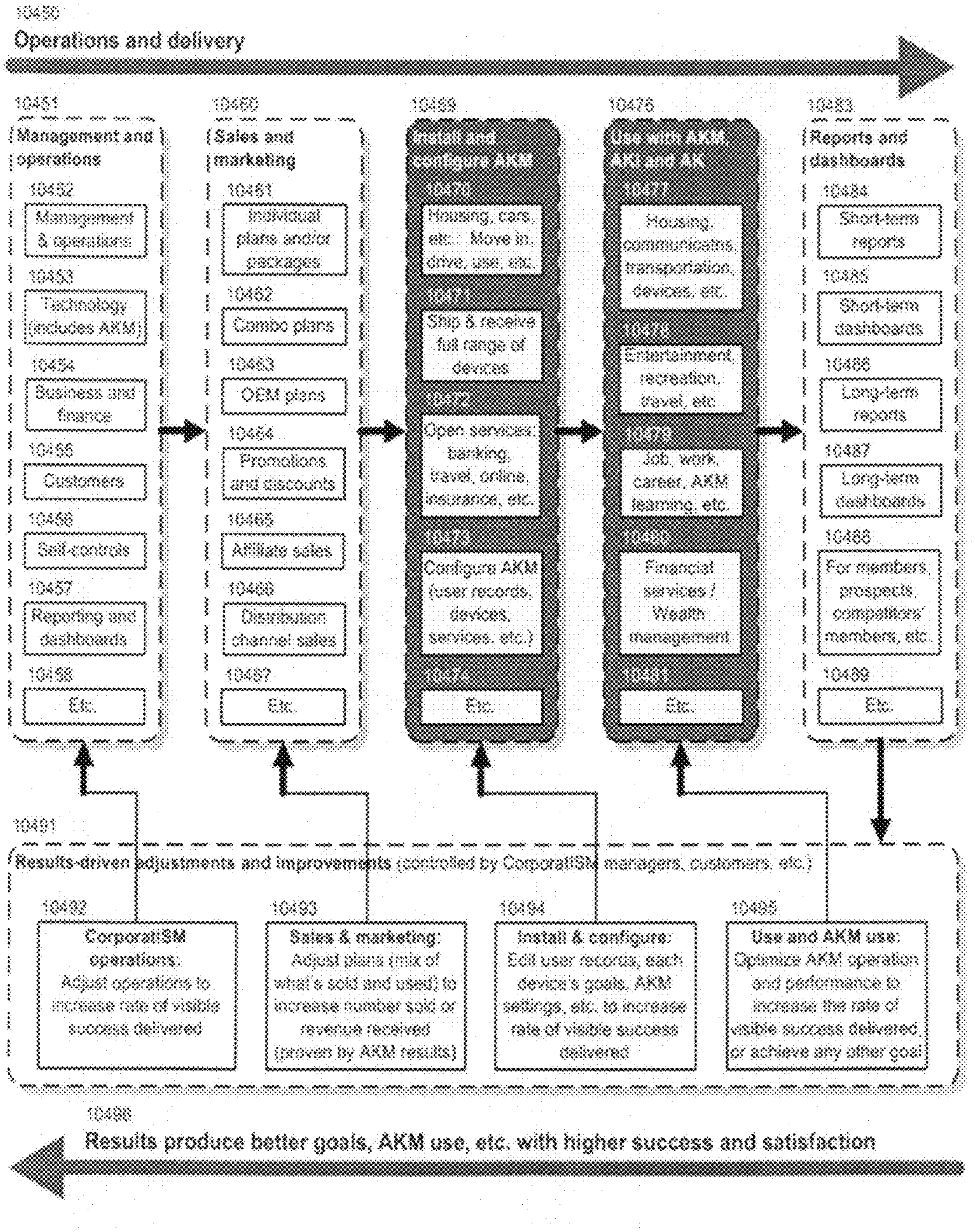

FIG. 265 is a block diagram illustrating some examples of a CorporatISM Governance example—upward mobility to lifetime luxury "package."

Figure 266:
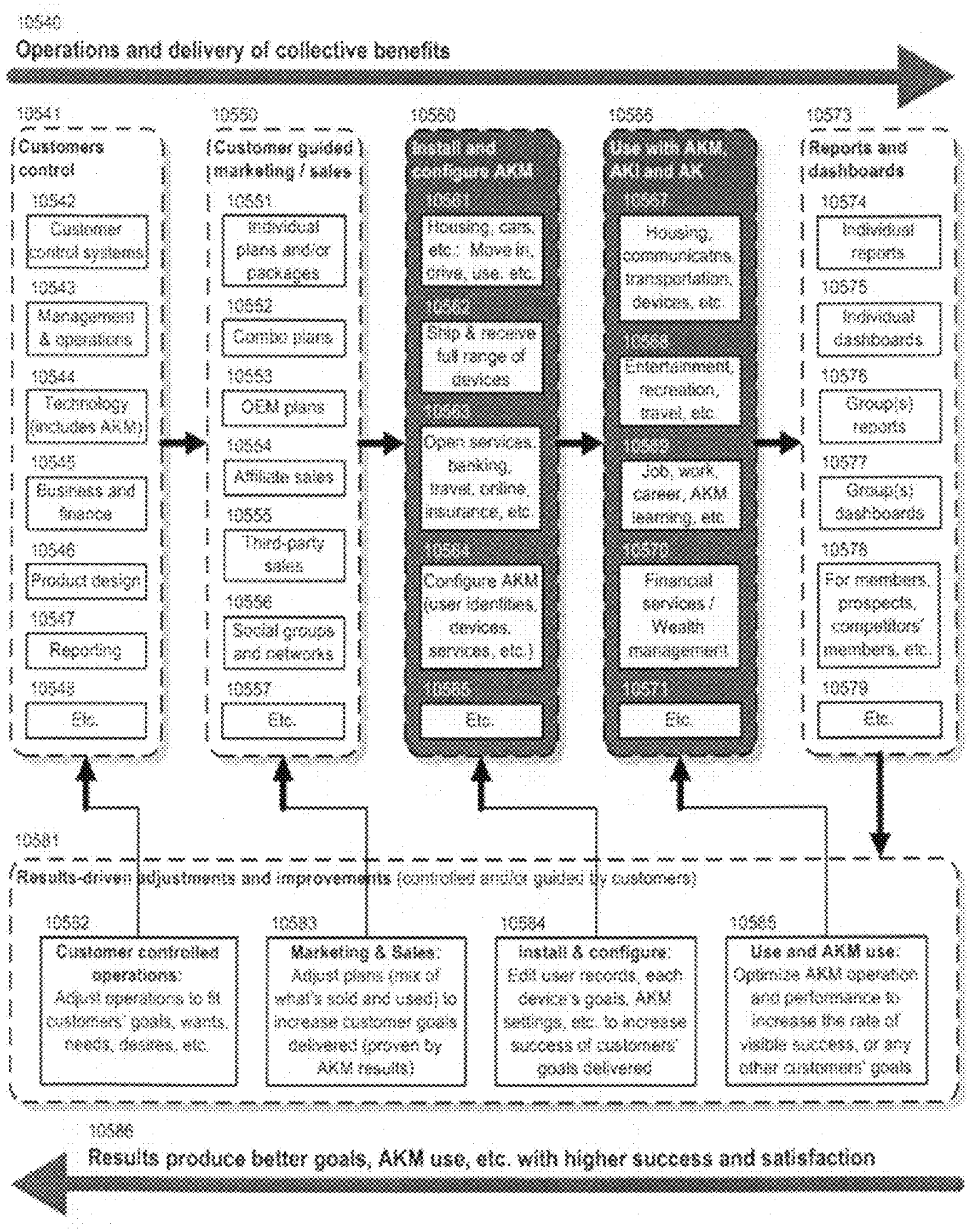

FIG. 266 is a block diagram illustrating some examples of an IndividualISM Governance example—one or more 'Customers In Control, Inc.').

Figure 267:
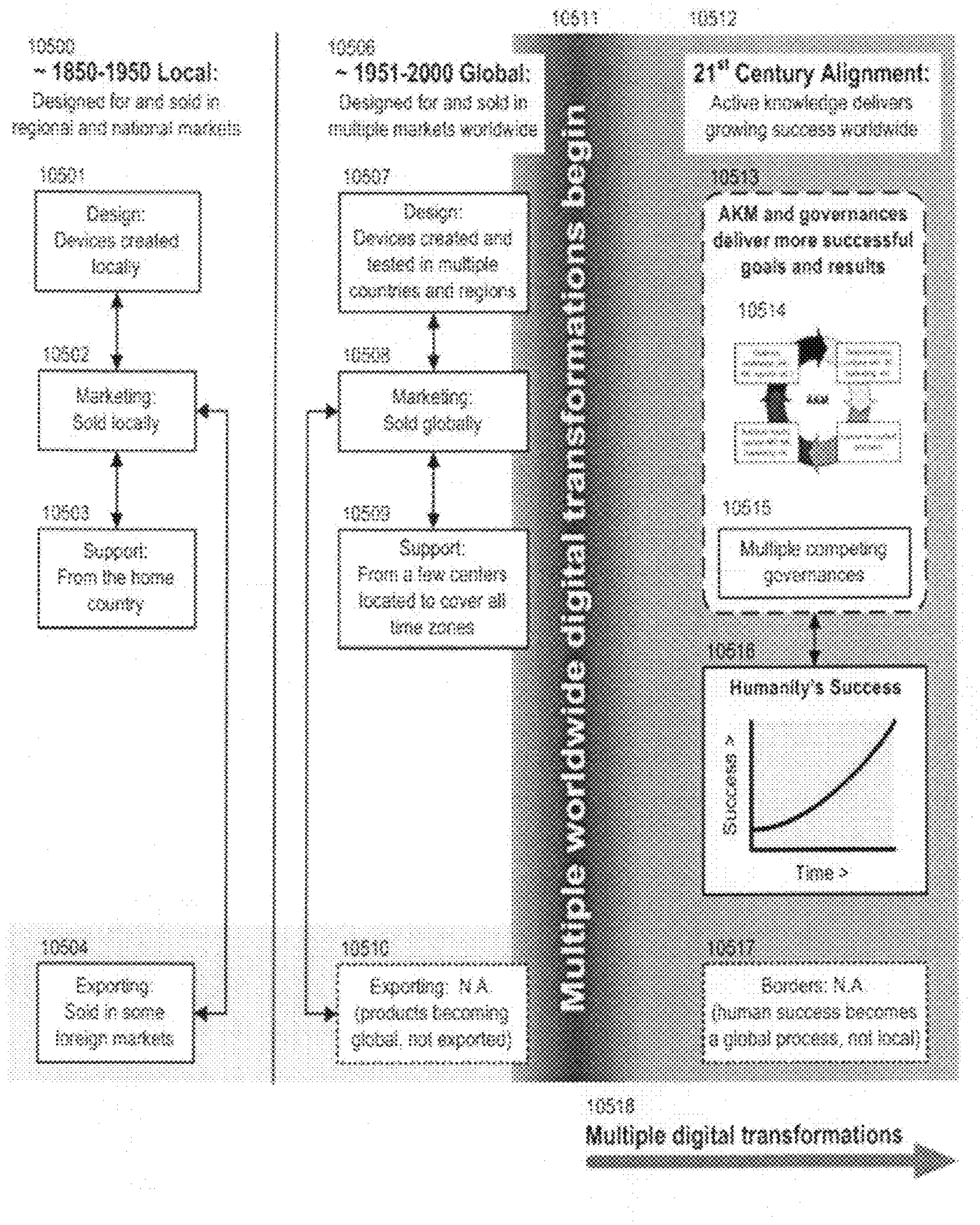

FIG. 267 is a block diagram illustrating some examples of AKM transformations as a driver of humanity's success.

Figure 268:
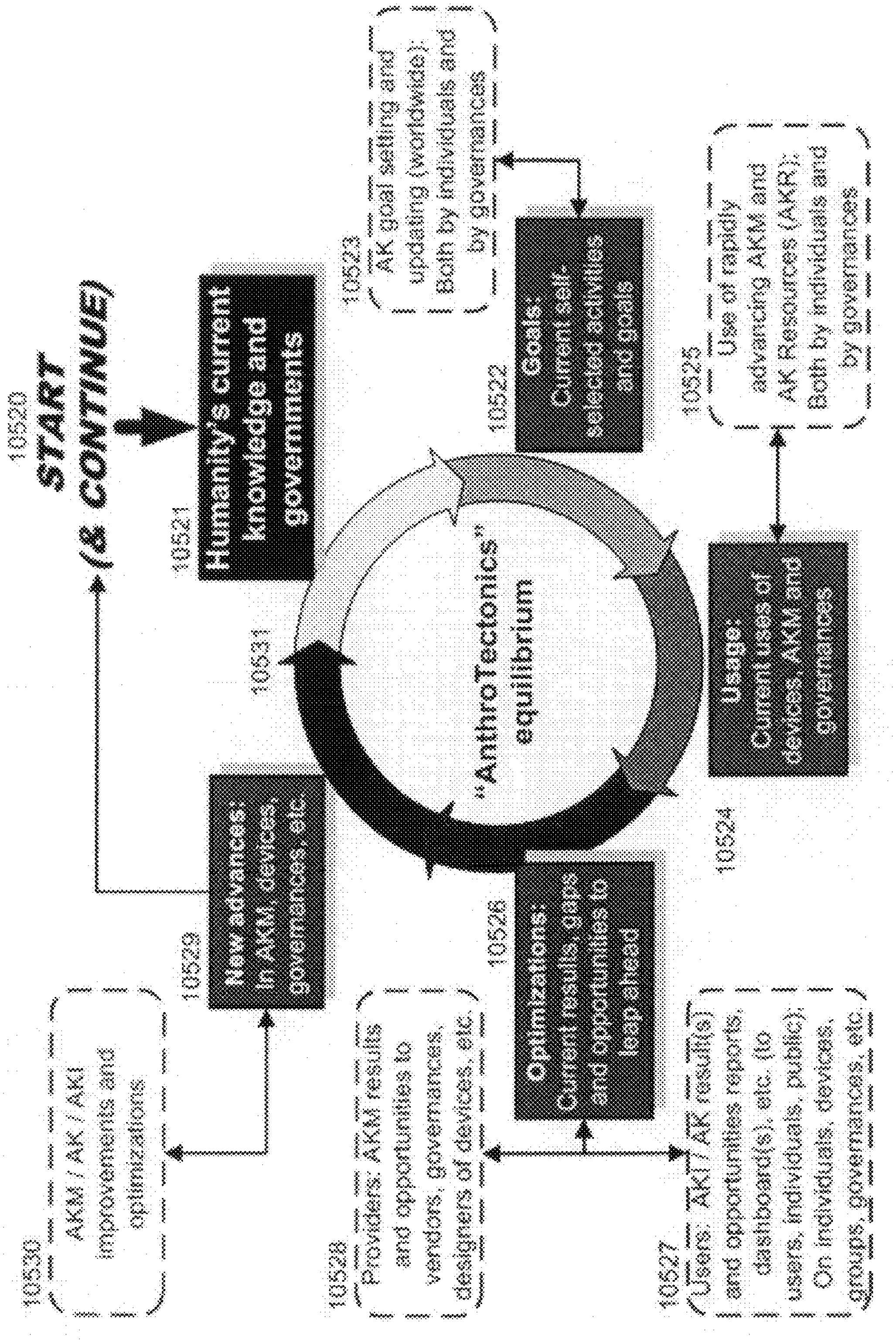

FIG. 268 is a block diagram illustrating some examples of AnthroTectonics: continuous AKM transformations of devices and Governances.

Figure 269:
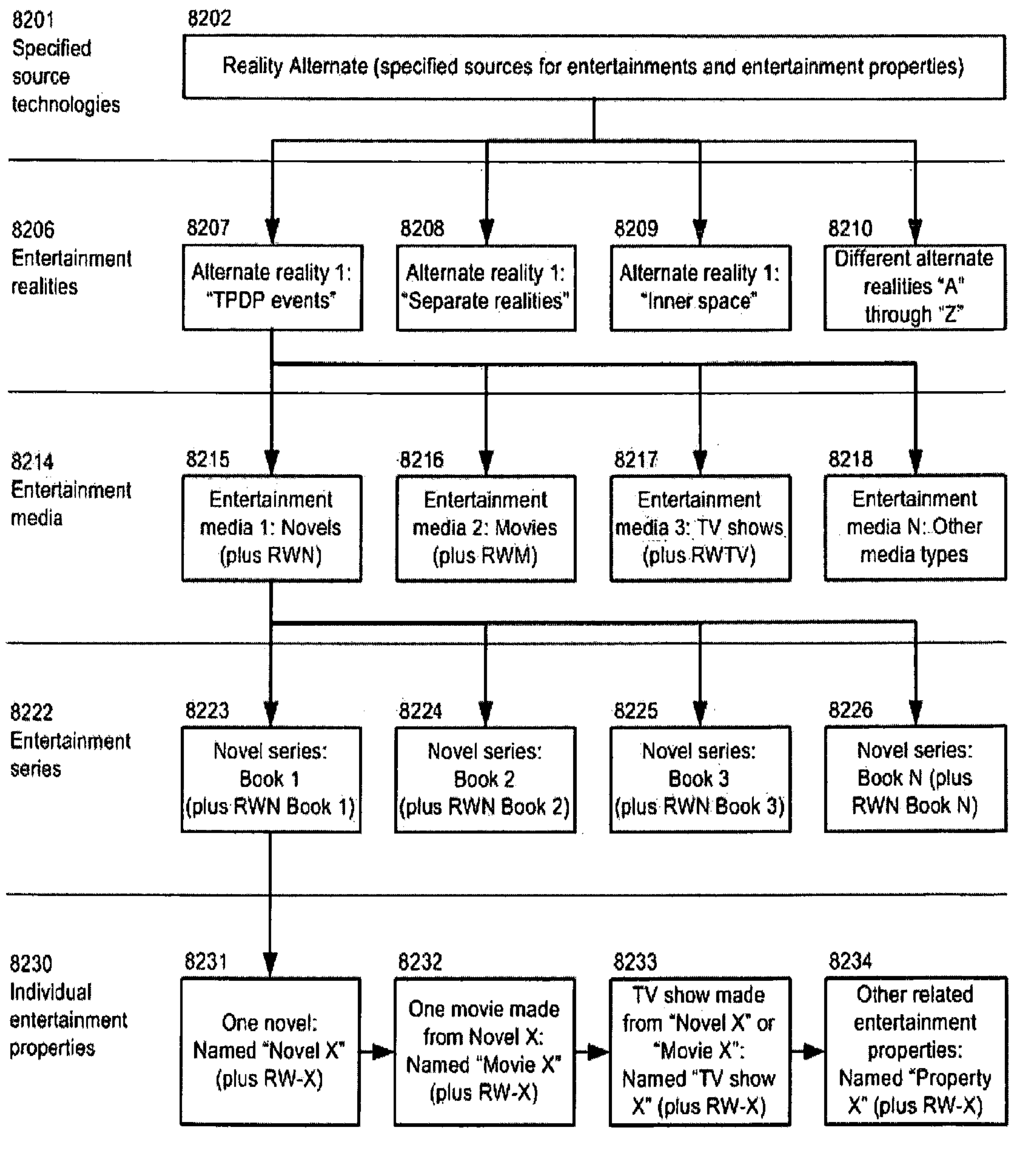

FIG. 269 is a flow chart showing some examples of some options for using Reality Alternate technologies, in some examples in entertainment products, in some examples as extensions to entertainment products, and in some examples as expansions of entertainment products.

Figure 270:
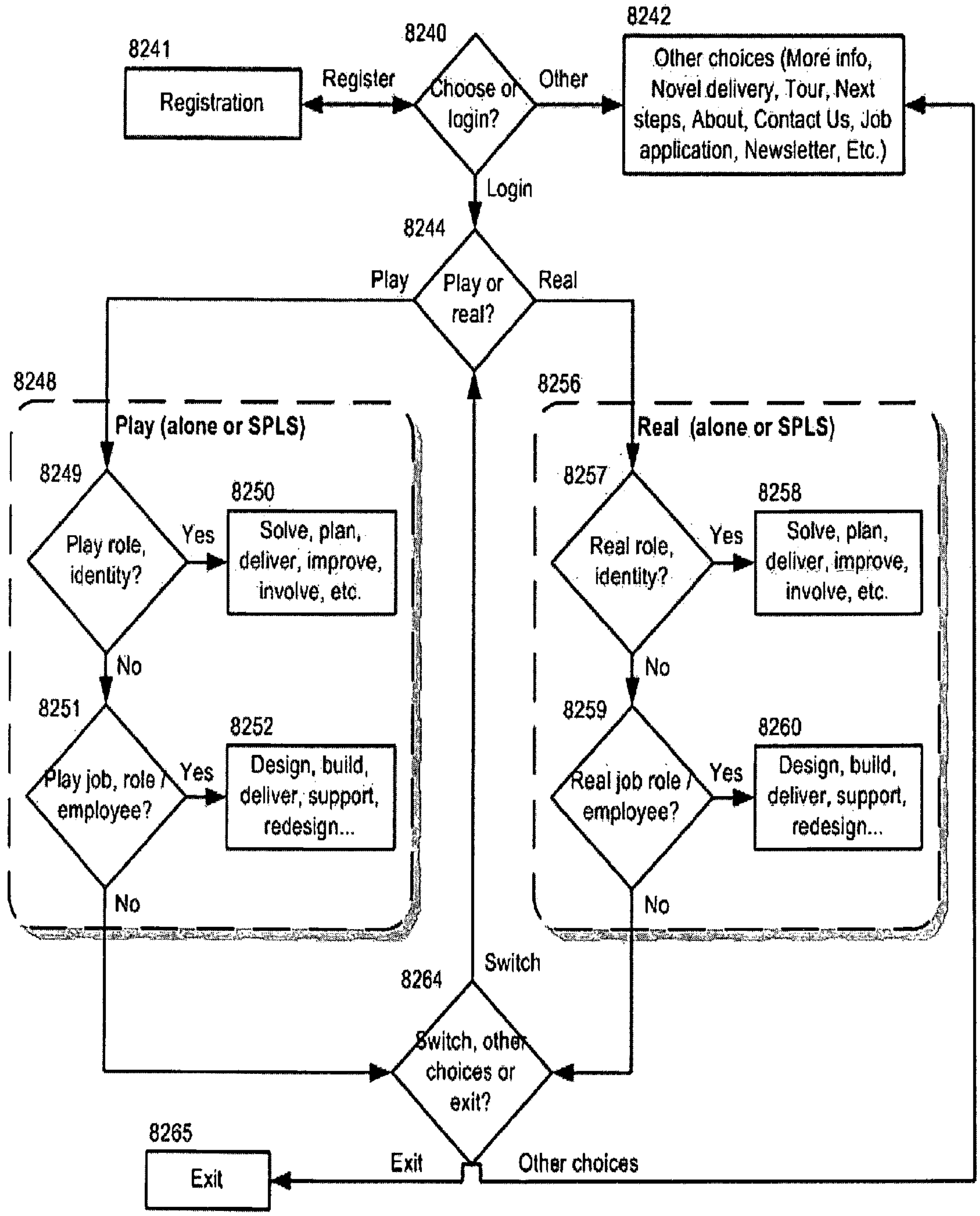

FIG. 270 is a flow chart showing some examples of a new form of online entertainment, "RealWorld Entertainment" (RWE), which blends games with the real world, blends income producing economic activity within games with the real world, and crosses boundaries between how games operate and affect the real world.

Figure 271:
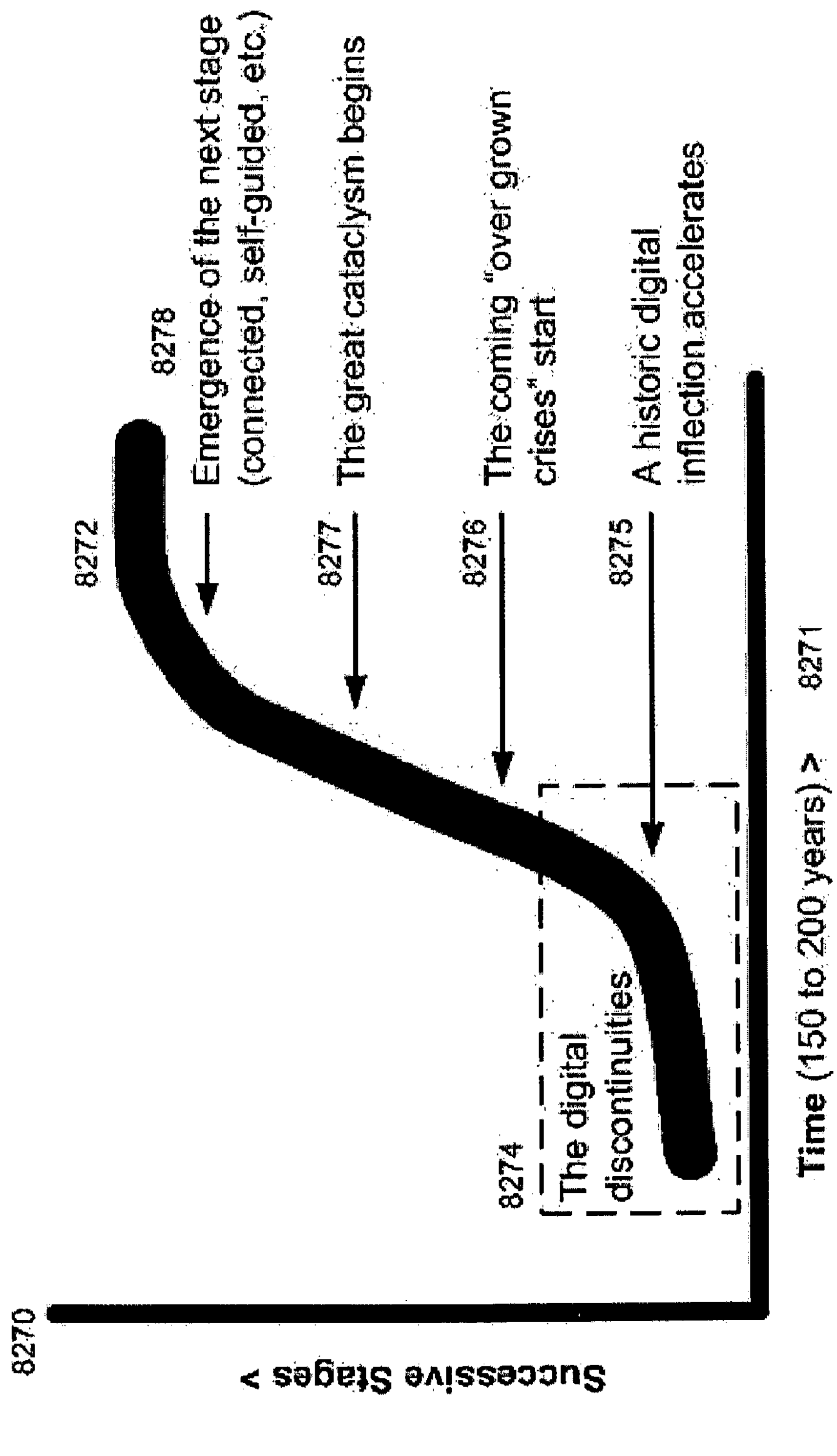

FIG. 271 is a graphical diagram showing some examples of the RWE's (RealWorld Entertainment's) roadmap and timeline, which is the ARTPM Alternate Reality history and Expandaverse on which the Reality Alternate technologies are based.

Figure 272:
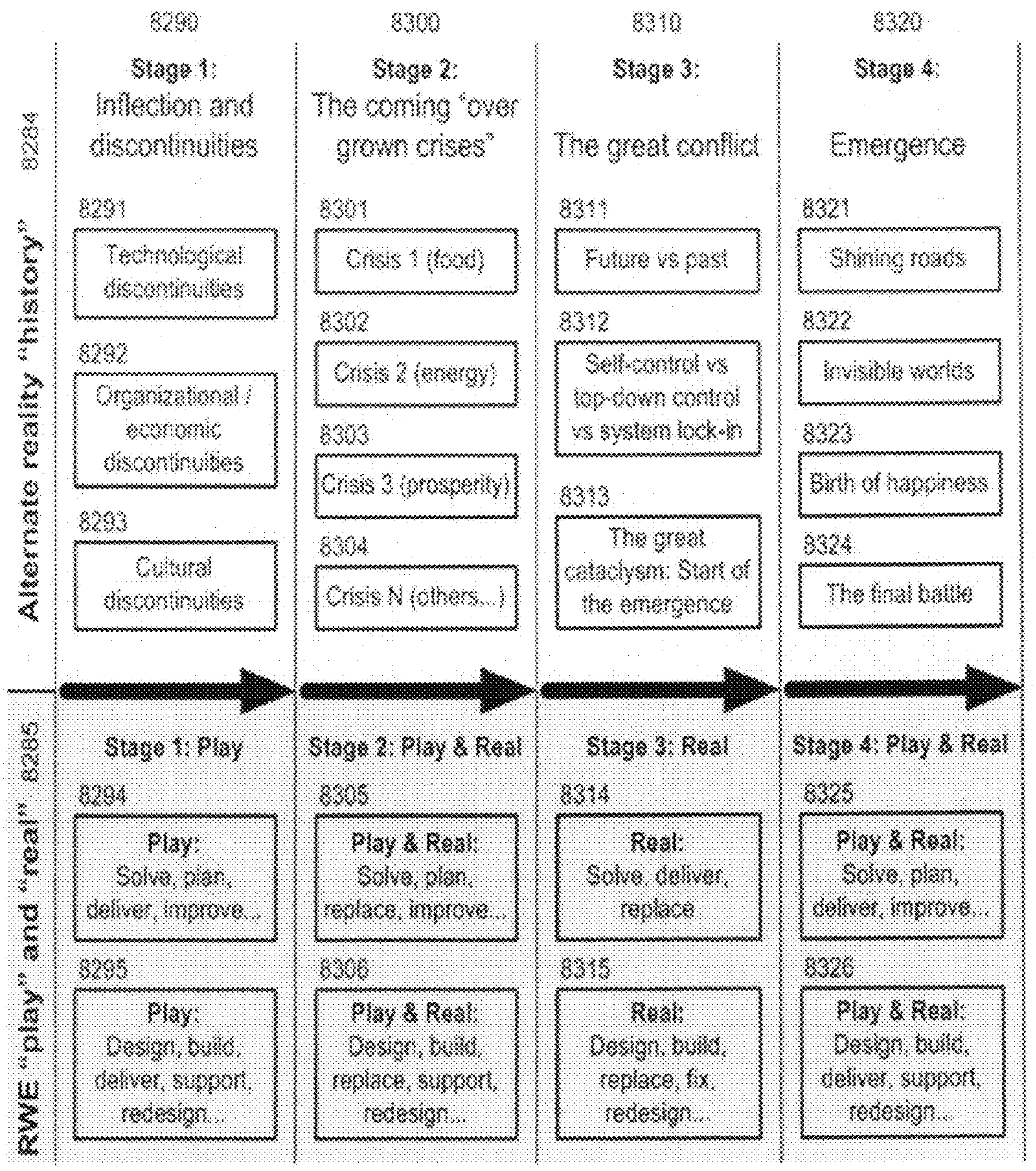

FIG. 272 is a graphical diagram showing some examples of the RWE's timeline in both the ARTPM's "history" and in the RWE's play and real activities.

Figure 273:
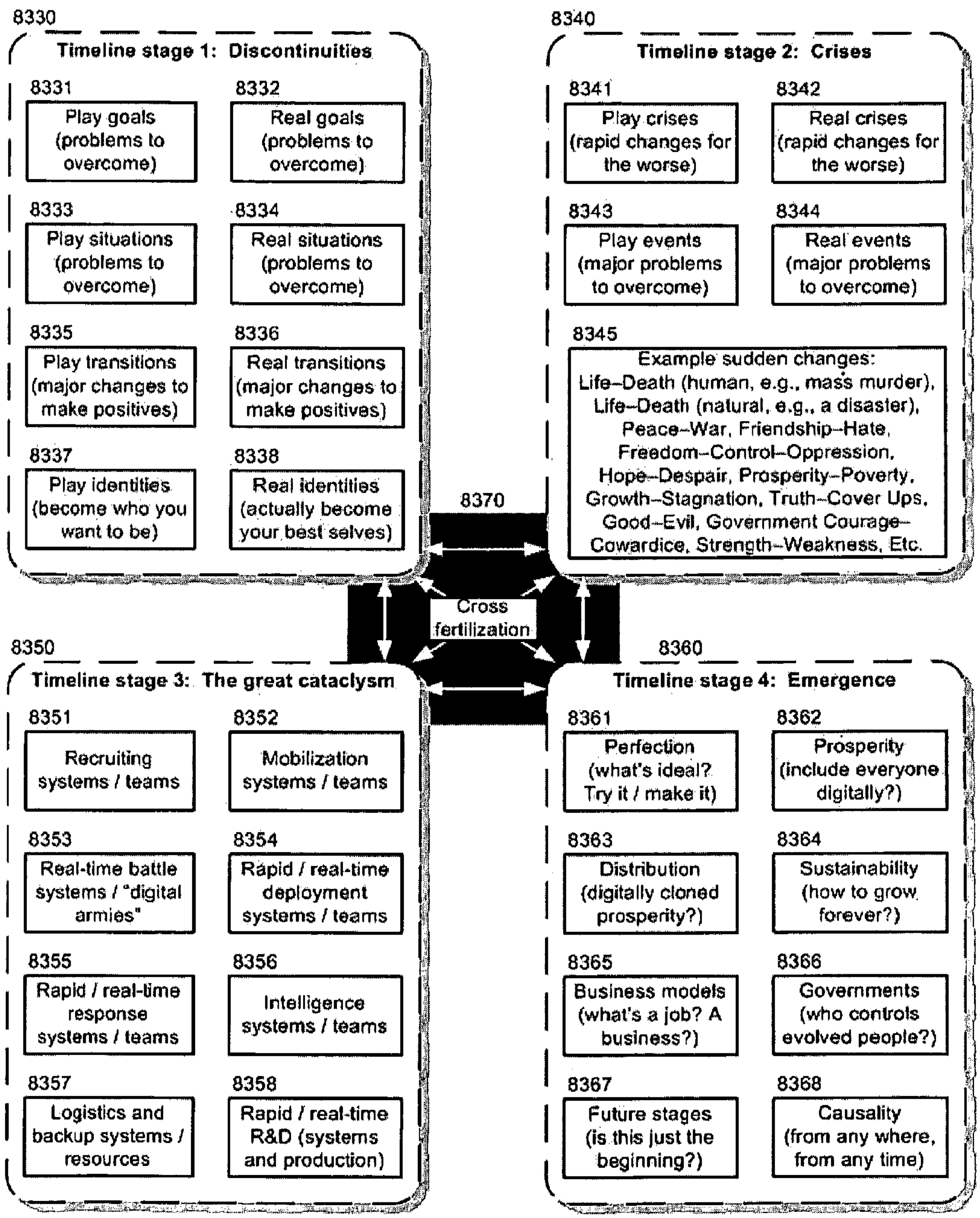

FIG. 273 is a block diagram showing some examples of the RWE's non-linear timeline, which in some examples "players" can enter at any stage of the ARTPM Alternate Reality's history.

Figure 274:
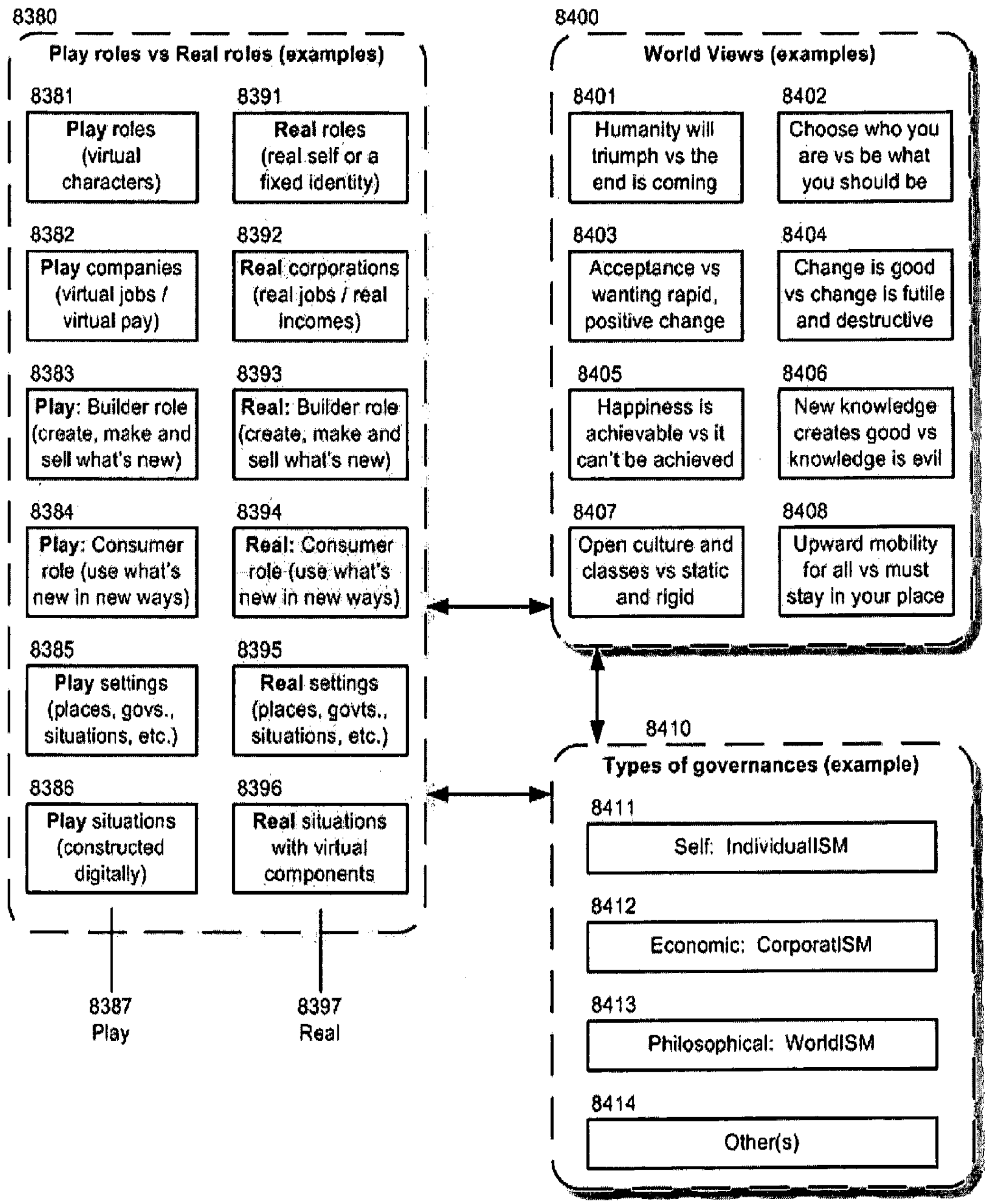

FIG. 274 is a block diagram showing some examples of the RWE's roles, world views and types of governances.

Figure 275:
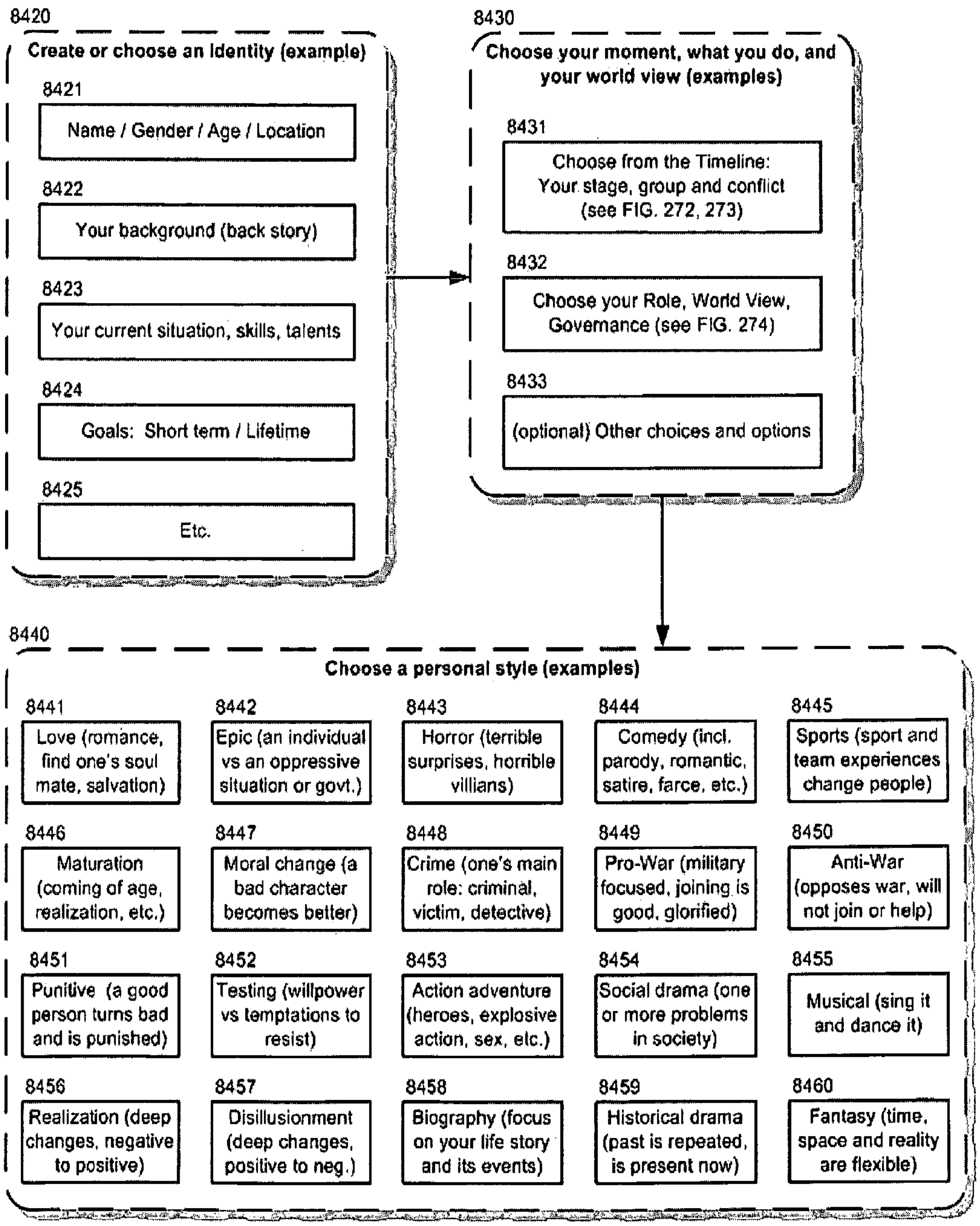

FIG. 275 is a block diagram showing some examples of entering the RWE's by choosing an identity(ies), timeline, stage, conflict, world view, Governance and style.

Figure 276:
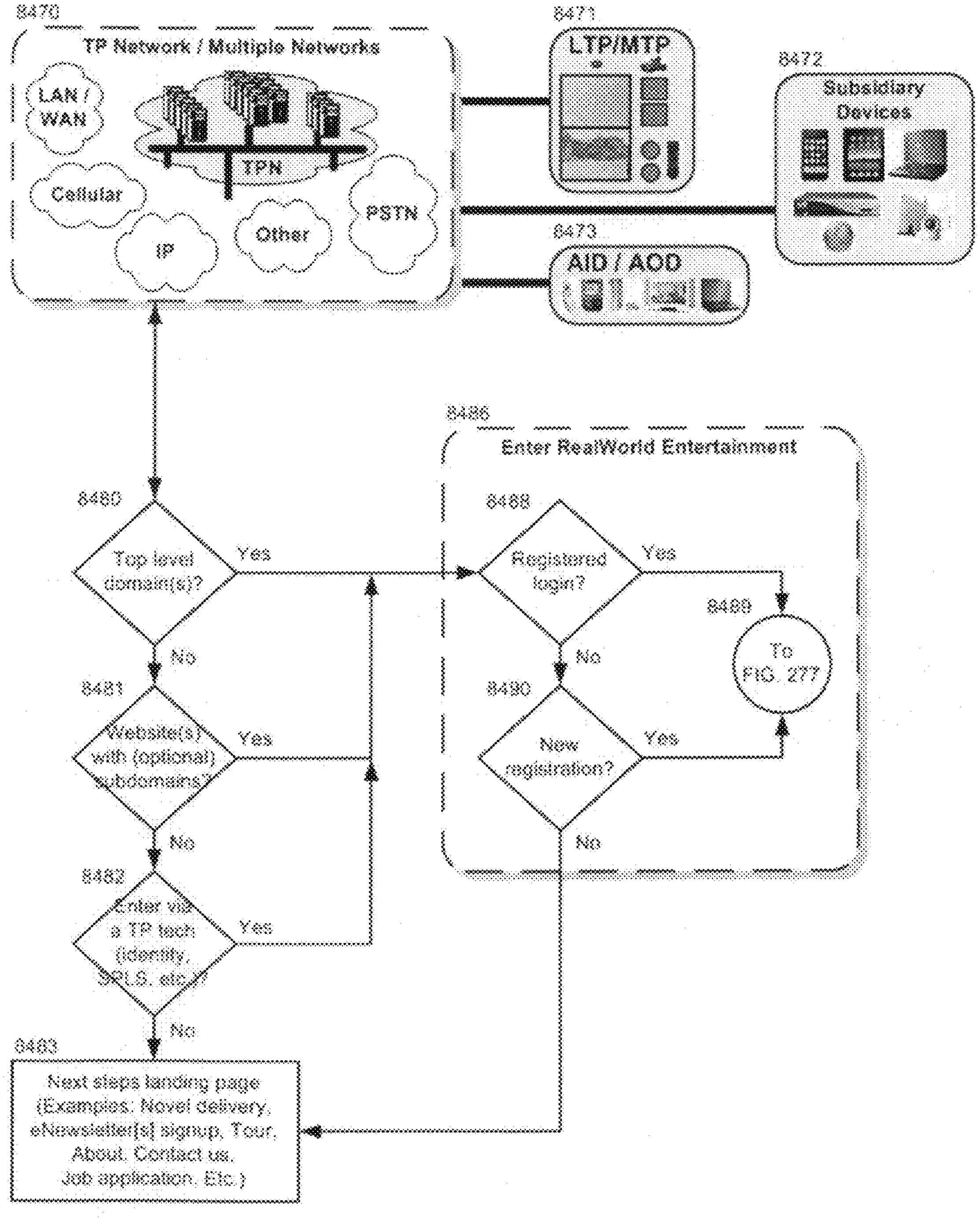

FIG. 276 is a flow chart showing some examples of some procedures for accessing the RWE.

Figure 277:
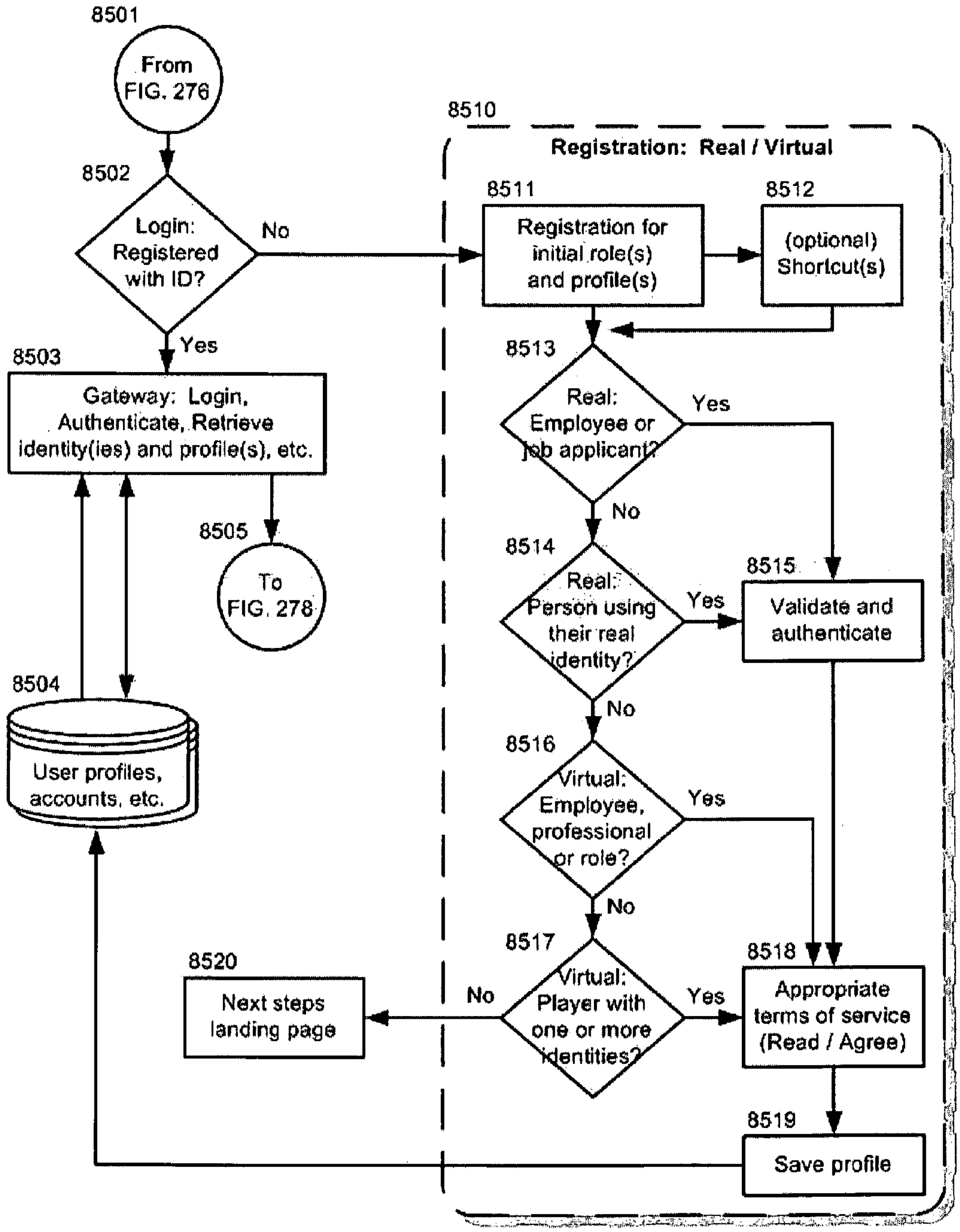

FIG. 277 is a flow chart showing some examples of some procedures for logging in to the RWE, or in some examples registering as a real player, in some examples applying for a real paid job as a player, in some examples as an unpaid game player, in some examples as a virtual non-real employee, or in some examples in another way of joining and/or entering the RWE.

Figure 278:
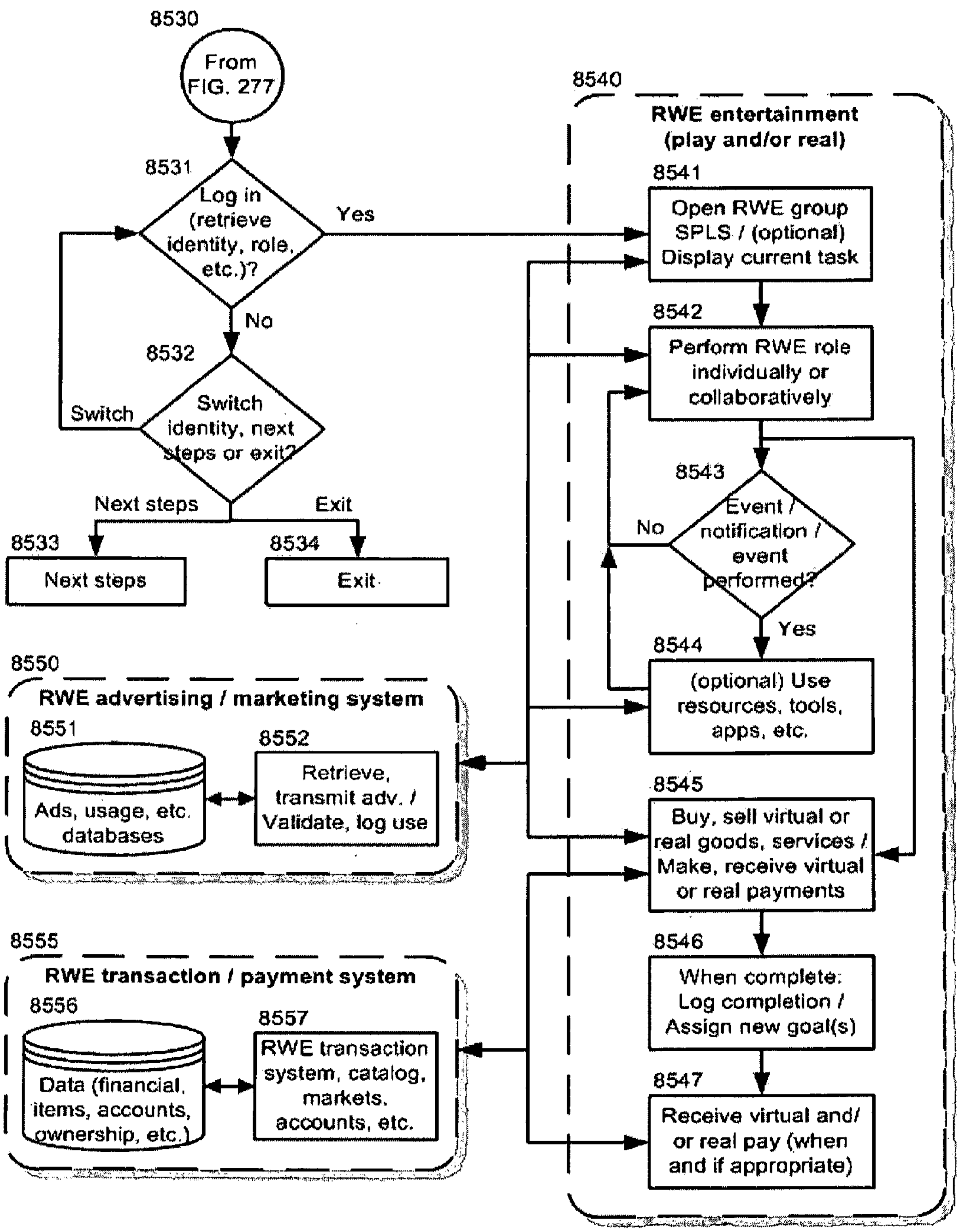

FIG. 278 is a flow chart showing some examples of some procedures for using the RWE including some examples of making, buying and selling real RWE goods or services, or virtual RWE goods or services with real money, virtual money, scrip or another financial instrument; and in some examples having an RWE financial account that may contain real money, virtual money, scrip, assets, liabilities or another financial instrument.

Figure 279:
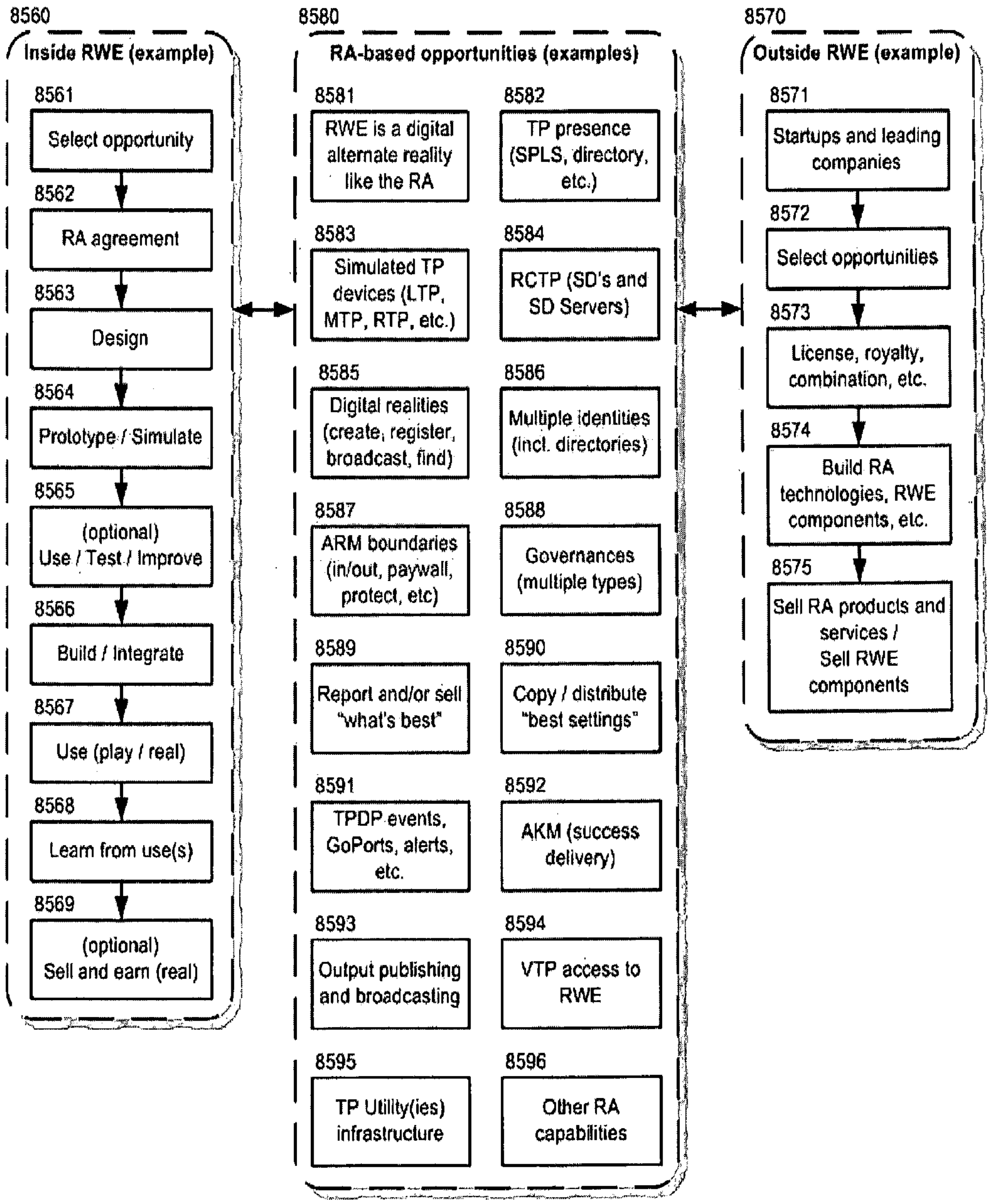

FIG. 279 is a block diagram showing some examples of RWE groups building Reality Alternate technologies or performing other commercial activities for the RWE and/or for the real world in order to produce sales and earn virtual and/or real money; and in some examples companies outside the RWE building those technologies for money.

Figure 280:
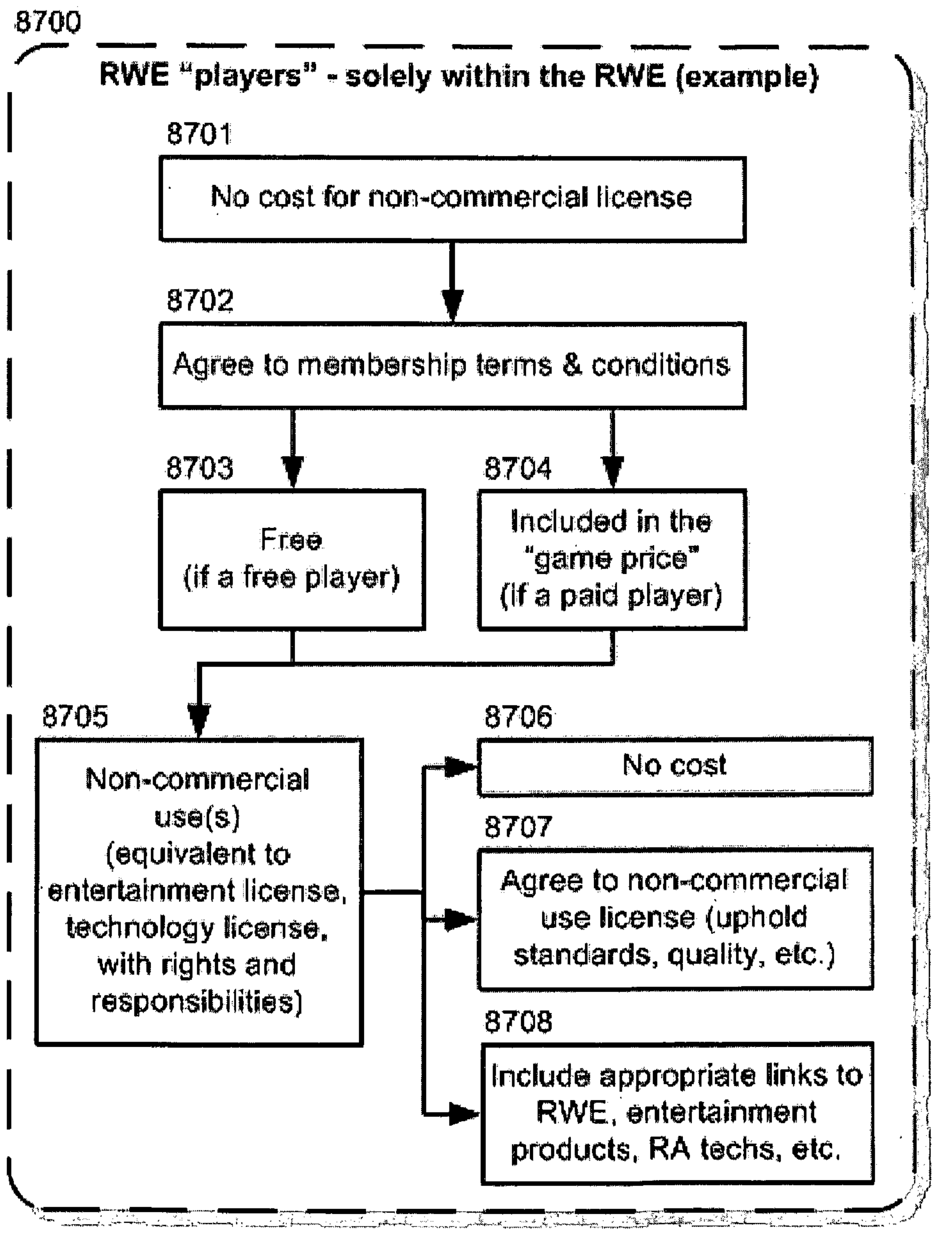

FIG. 280 is a flow chart showing some examples of some procedures for using Reality Alternate technologies for no cost and no license fee within the RWE.

Figure 281:
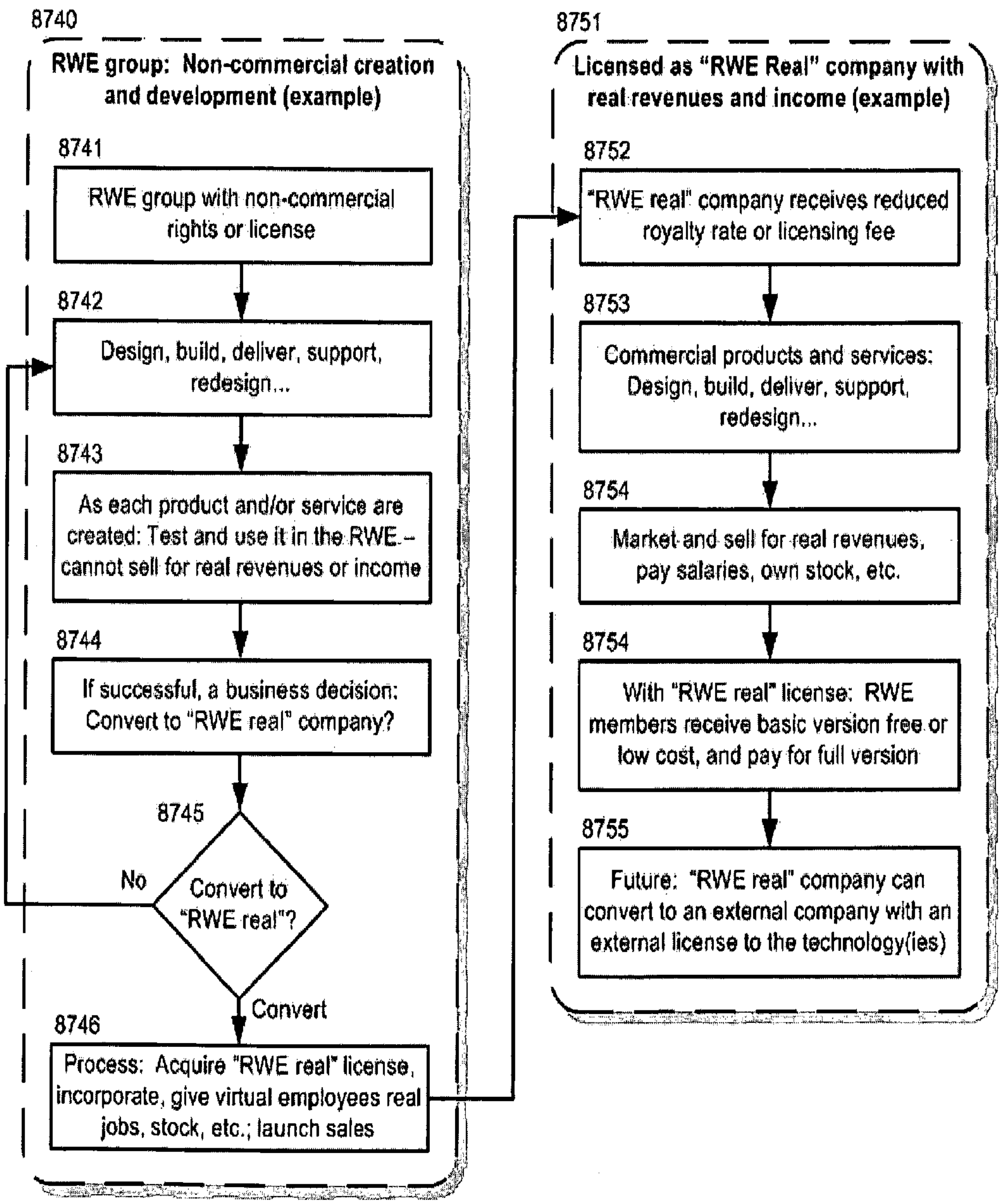

FIG. 281 is a flow chart showing some examples of some procedures for an RWE "play" member or group evolving into an "RWE real" member or group that is paid in real money and earns real income.

Figure 282:
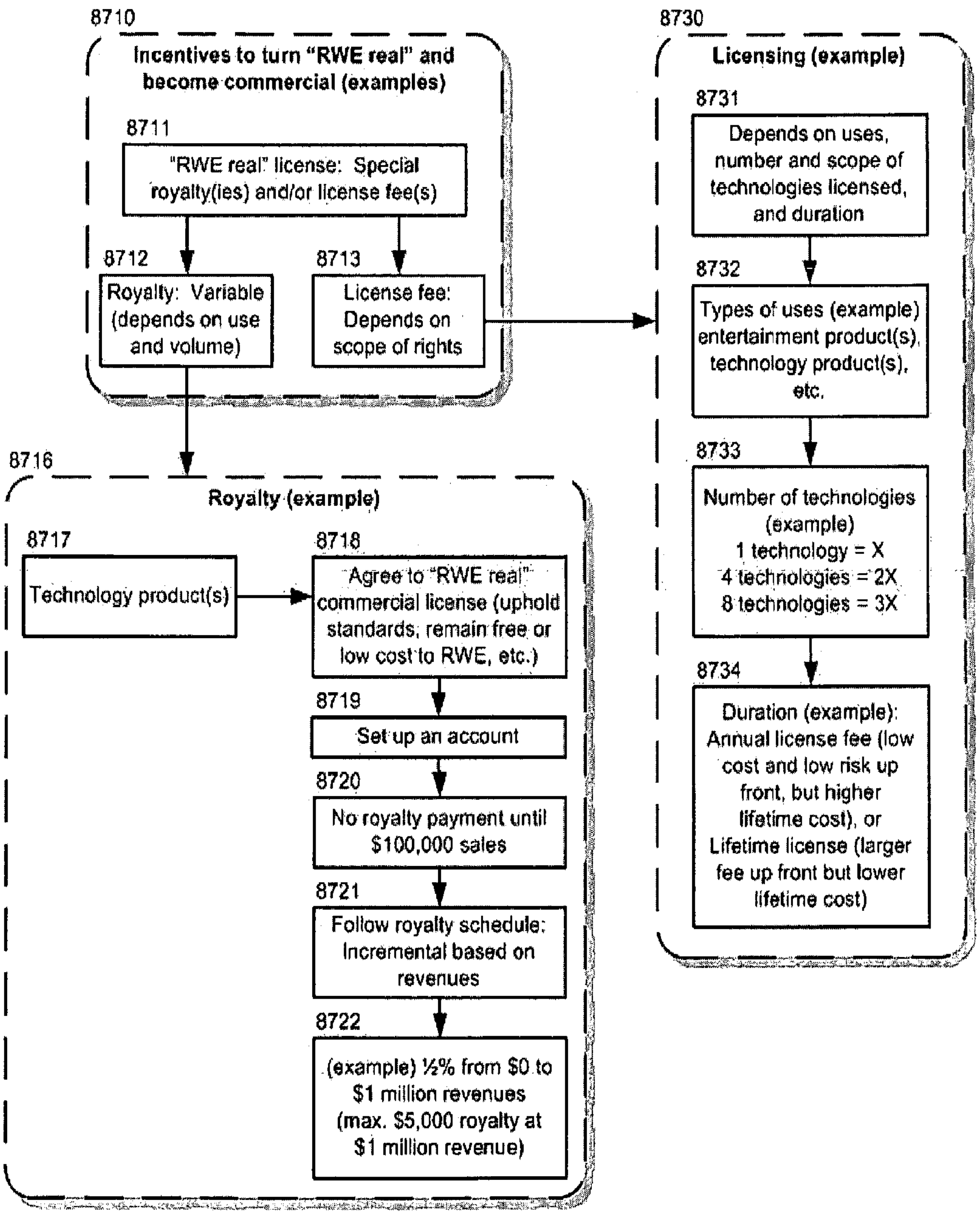

FIG. 282 is a flow chart showing some examples of some procedures for transitioning from an RWE "play" group (or individual) to an "RWE real" group that can earn real money and employ Reality Alternate technologies in a plurality of licensed activities.

DETAILED DESCRIPTION

In the examples the components may consist of any combination of devices, components, modules, systems, processes, methods, services, etc. at a single location or at multiple locations, wherein any location or communication network(s) includes any of various hardware, software, communication, security or other components. A plurality of examples that incorporate these examples may be constructed and included or integrated into other devices, applications, systems, components, methods, processes, modules, hardware, platforms, utilities, infrastructures, networks, etc.

Figure 1A:
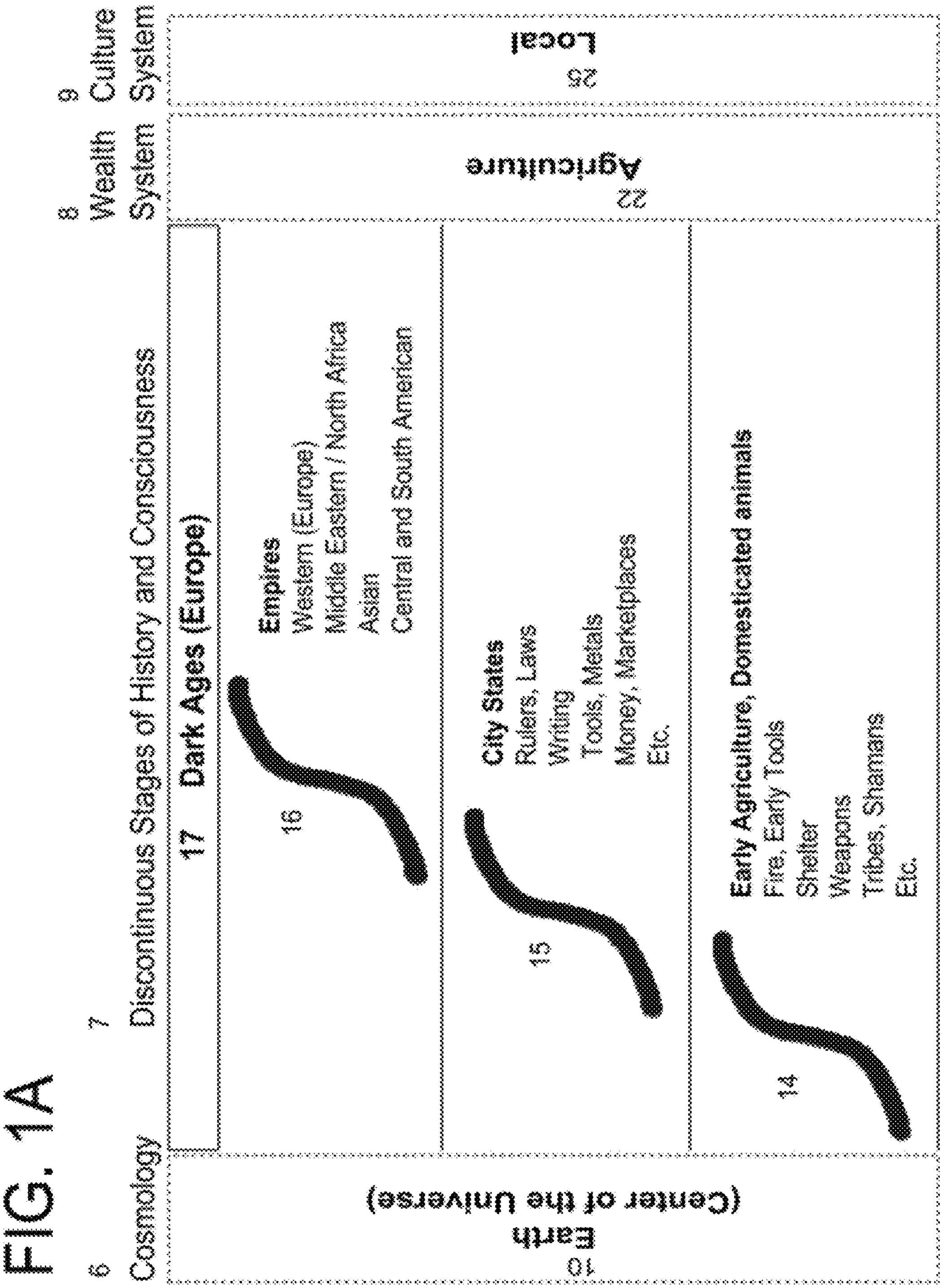
FIG. 1 is a pictorial diagram that illustrates a history timeline that diverges during a period of digital discontinuities that begin to produce the emergence of an Alternate Reality Teleportal Machine (ARTPM) and the Expandaverse.
Figure 1B:
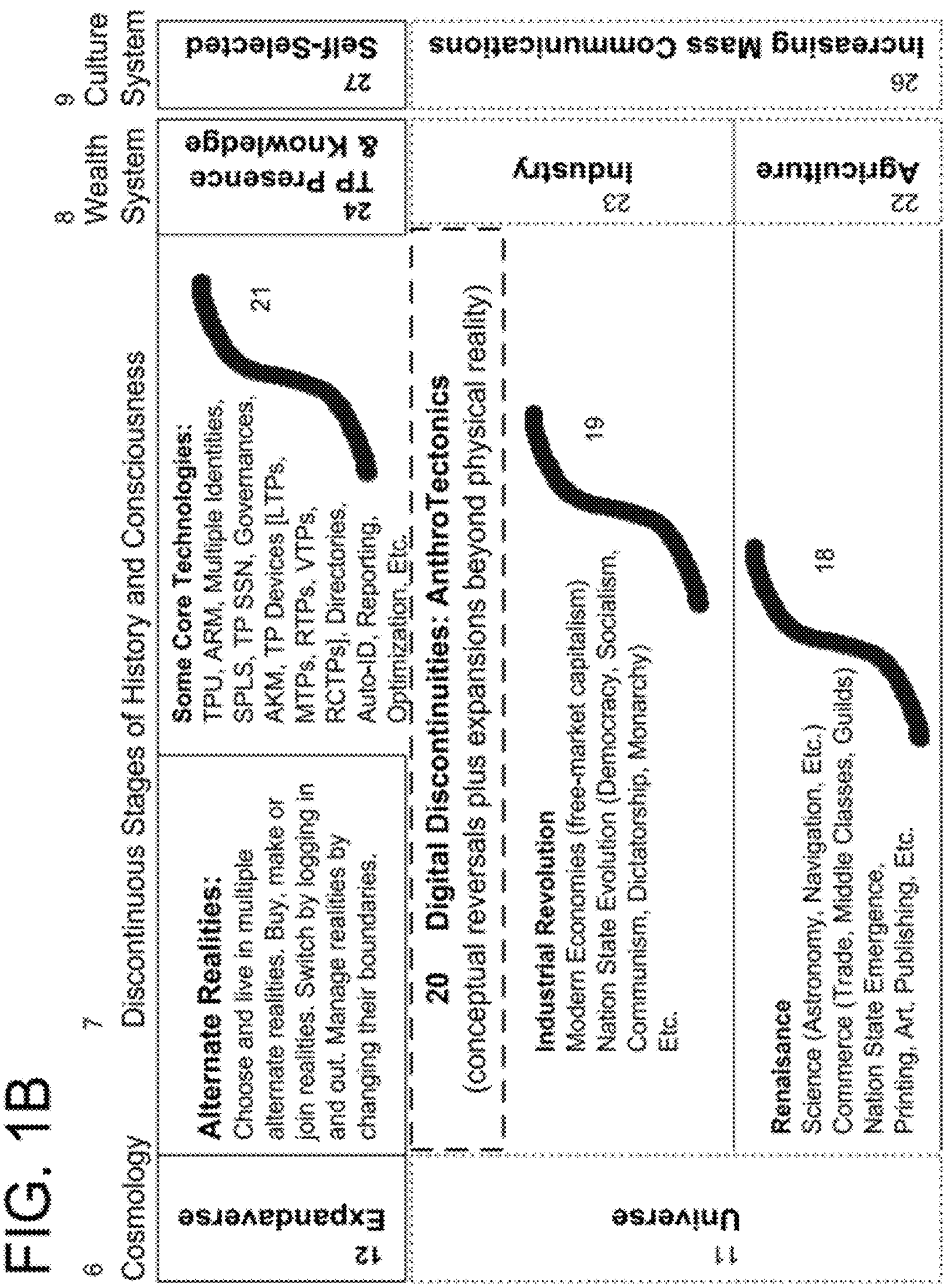

Emergence of Expandaverse and Alternate Realities:

Turning now to FIG. 1, "Emergence of Expandaverse and Alternate Realities," this Alternate Reality has the same history as our current reality before the development of digital technologies, but then diverged with the Alternate Reality emerging as a different digital evolution during the recent digital environment revolution. After that the realities diverged with the "history" of the Expandaverse developing and using new technologies whose goal is to deliver a higher level(s) of human success and connections as a normal network process—just as you can plug any electric appliance in a standard wall outlet and receive power, the Expandaverse's reality developed a new type of "Teleportal Utility," "Teleportal Devices" and ARTPM components that provide success, presence and much more—which in this Alternate Reality, alters the success and quality of life of individuals, groups, corporations and businesses, governments and nations, and human civilization.

As depicted in FIG. 1 four views of this Alternate Reality's history are illustrated simultaneously. The Alternate Reality's Cosmology 6 12, Stages of History 7 21, Wealth System 8 24 and Culture system 9 27 diverged from our current reality recently, starting with Digital Discontinuities 20 that occur during the recent digital era. This Alternate History posits a series of conceptual reversals 20 plus expansions beyond physical reality 20 that are described in more detail in FIG. 2 (which divides the discontinuities into three sub-stages: Technological discontinuities, Organizational discontinuities, and Cultural discontinuities) and elsewhere.

The reasons for the Digital Discontinuities 20 is that digital technology provides new means—technologies that can be designed and combined at new levels such as in some examples meta-systems—to define and control human reality, whether as one reality or as multiple simultaneous alternate realities. In this Alternate History reality has been designed to achieve clear goals that include delivering and/or helping achieve a higher level(s) of human success, satisfaction, wealth, quality of life, and/or other positive benefits as normal network services—just as you can plug any electrical appliance in a standard wall outlet and receive power, the Alternate Reality Expandaverse was developed as a new type of "utility" so plugging in provides success, global digital presence and much more—altering the lives of individuals, groups, corporations and businesses, governments and nations, and civilizations.

Cosmology 6 (left column of FIG. 1): Cosmology is the first of this Alternate Reality's views of human history: First is "Earth as the center of the universe" 10. For most of human history 14 15 16 17 the Earth was believed to be the center of a small universe 10 whose limits were immediate and physically experienced—what the human eye could see in the night sky, and where a person could travel before possibly falling off the edge of the earth. Second is "The Universe" 11. Starting with the rebirth of science during the Renaissance 18 and continuing thereafter 19, the Universe 11 was a scientifically proven physical entity whose boundaries have been repeatedly pushed back by new discoveries—initially by making the Earth just one of the planets that revolve around the sun, then discovering that the sun is just one of the stars in a large number of galaxies, then "mapping" the distribution of galaxies and projecting it backwards to the Big Bang when the Universe came into existence. Today scientists are continuing to expand this knowledge by pursuing theories of multiple dimensions and strings, and by using new tools such as the Large Hadron Collider (LHC). Third is the "Expandaverse" 12. The Alternate Reality's cosmology diverges from the current reality's cosmology starting with discontinuities 20 that occur during the recent digital era. This Alternate History Stage 21 posits a Cosmology transition from the Universe 11 to the Expandaverse 12 (as described elsewhere).

Stages of History 7 (center column of FIG. 1): A second of this Alternate Reality's views of human history is the Stages of History 7 which are described as discontinuous stages because the magnitude of each change required new forms of consciousness and awareness to come into existence. Some examples of this are common throughout history starting with agricultural stability replacing nomadic hunting and gathering; with money and markets replacing bartering physical goods; with city states, rulers and laws replacing tribal leaders; right up to telephone calls replacing written letters. Each substantial change requires a change in consciousness of what we do, how we do that, and in some cases who and what we are, our relationships with those around us, and our expectations for our lives and futures. A somewhat more detailed example with its own stages is the invention of money which changed value from individual physical items to abstract values represented by "prices" rather than utility—and over time changed pricing from bargained prices to fixed prices—with each of these changes requiring people to learn new ways to think, feel and re-conceptualize the ways we acquire most of the things in their lives, until today we buy most of what we need at fixed prices.

This view of history (as discontinuous stages that include discontinuities in people's consciousness) fits the Expandaverse 12 stage 21 because the Expandaverse includes new forms of awareness and consciousness. In addition, the "S-curve" is used to represent each stage of history 14 15 16 18 19 21 because the S-curve describes how new technologies are spread, how they mature, and then how they are eclipsed and disrupted by newer technologies. In brief, innovations have a life cycle with a startup phase during which they are developed and (optionally) improved; they then spread from the innovator to other individuals and groups (sometimes rapidly and sometimes slowly) as others realize the value of each new invention; this diffusion and growth stage may increase in speed and scope if (optional) improvements are made in the technology; the process typically slows after the diffusions and improvements have been exhausted and a mature technology is in place; mature technologies are often ripe for replacement by new innovations that must start at the bottom of their own S-curve. While FIG. 1 illustrates this as major stages of history 14 15 16 18 19 21, in reality there are countless smaller technologies, stages, innovations, and advances that have it each climbed their own S-curves, only to be replaced and eclipsed by newer innovations—or declines, as illustrated by the Dark Ages 17.

In the center column's stages of history 7, these discontinuous stages in both history and consciousness are illustrated as: Agriculture 14 which roughly includes domesticated animals, fire, stone tools and early tools, shelter, weapons, shamans, early medicine and other innovations from the same period of history. City states 15 which roughly includes rulers, laws, writing, money, marketplaces, metals, blacksmithed tools and weapons, and other innovations from the same period of history. Empires 16 which roughly includes larger civilizations formed in Europe, the Middle East and North Africa, Asia, and central and south America—as well as the numerous innovations and institutions required to create, govern, run and sustained each of these empires/civilizations. The Dark Ages 17 is noted to illustrate how humanity, civilization and our individual consciousness can be diminished as well as increased, and that there may be a correlation between the absence of freedom and the (e) quality of our lives. The Renaissance 18 roughly includes a rebirth of independent thinking with the simultaneous developments of science (such as astronomy, navigation, etc.), art, publishing, commerce (trade, the rise of guilds and skills, the emergence of the middle classes, etc.), the emergence of nation states, etc. The Industrial Revolution 19 produced too many innovations and changes in consciousness to list, with a few notable examples including going from the first flight in 1903 to the first walk on the moon in 1969 (less than 70 years), transportation (from trains to automobiles, trucks, national highway systems, and worldwide international jet flights), mass migrations for work (first to the cities and then to the suburbs and then to airports for routine inter-city job travel), electronic communications (from the telegraph to the telephone, cell phone, e-mail, and the Internet), manufacturing (from factories to assembly lines to mass customization of products and services), mass merchandising of disposable products and services (from "wear it out" to "throw it out"), and much more.

Expandaverse 21: The Alternate Reality's Expandaverse stage of history diverges from the current reality's history starting with "AnthroTectonic Discontinuities" 20 that began during the recent digital era. This Alternate History posits a historic stage transition from the Industrial Revolution 19 to an Alternate Realities 21 Stage. In the Expandaverse individuals may have multiple identities, and each identity may live in one or a plurality of Shared Planetary Life Spaces (SPLS). Each SPLS may be its own alternate reality that is determined and managed by controlling its boundaries, with specific means for doing this described in the Alternate Reality Machine (ARM) herein. Each identity may switch between one or a plurality of SPLS's (alternate realities) by logging in and out of them. The Expandaverse's initial core technologies include those described herein, including in some examples: TPU (Teleportal Utility) 21, ARM (Alternate Realities Machine) 21, Multiple identities/Life Expansion 21, SPLS (Shared Planetary Life Spaces) 21, TP SSN (Teleportal Shared Spaces Network) 21, Governances 21, AKM (Active Knowledge Machine) 21, TP Devices 21 (LTPs, MTPs, RTPs, AIDs/AODs, VTPs, RCTPs, Subsidiary Devices), Directory(ies) 21, Auto-identification of identities 21, optionally including auto-classifying and auto-valuing identities, Reporting 21, optionally including recommendations, guidance, "best choices", etc., Optimizations 21, Etc.

Wealth System 8 (a right column of FIG. 1): The third of this Alternate Reality's views of human history is the dominant system for producing wealth 8 which is also viewed as discontinuous stages because each Wealth System also requires new forms of awareness and consciousness to come into existence. These are illustrated in a right column of FIG. 1, titled Wealth System 8 and include: The oldest and longest is Agriculture 22. Agriculture was the dominant economic focus for most stages of human history 14 15 16 17 18—a long period in which food was scarce, average life spans were short, disease was common, the vast majority of people were involved in agriculture, and wealth was rare. Under Agriculture 22 humanity's standard of living stayed nearly the same—"poor" by today's standards—for literally thousands of years. When the "human herd" was thinned by war, natural disasters, plagues, etc. food became abundant, people were better off and the "herd" grew until scarcity and poverty returned. Thomas Hobbes was considered accurate when he described the "Natural Condition of Mankind" in Leviathan (1651) as "solitary, poor, nasty, brutish, and short." With the recent rise of Industry 23, "Capitalism" within a stable and regulated governmental system may be defined and practiced in many ways, but there is no question that where this has been practiced successfully for decades or centuries it has produced the largest increases in wealth ever seen in human history. As a system of wealth production, nothing has ever exceeded the combination of private ownership of the means of production, a stable legal system that attempts to reduce corruption, prices set by market forces of supply and demand rather than economic planning, earnings set by market forces rather than economic planning or high tax rates, and profits distributed to owners and investors without excessive taxation. In short, when there is a good set of "rules" that provides the freedom to take independent personal and economic actions—and profit from them—the evidence from history shows that large numbers of people have a better chance to become prosperous and even rich than under any other economic or governmental system yet practiced.

A new Wealth System started emerging in this Alternate History from the ARTPM, Teleportal Presences & Knowledge 24. The "discovery" of the Expandaverse, a new digital world, opened new economic opportunities and exploitation, which is what happened when a "new world" was discovered in the past (such as Columbus's discovery of the physical New World). First and most important, this new Wealth System 24 did not change Capitalism 19 23 as it operated under the Industry Wealth System 23. In fact, it multiplied it and strengthened capitalism and its support for acquiring personal wealth by ever larger numbers of people through their independent self-chosen multiple identities and multiplied actions. In an alternate history example, imagine what millions more college graduates could do if added to the economy—so adding multiple identities allowed many college graduates to add new identities and the economy to rapidly obtain large numbers of economically experienced college graduates. In some ARTPM examples if you have multiple identities (with some public identities, some private identities, and some secret identities) each of your identities can live in separate alternate realities, earn separate incomes, own separate assets, and take advantage of different ways to produce wealth—expanding your range of economic choices so you have multiple ways to become wealthy, consume more, enjoy more in your life, and do much more with your multiple earnings—so that one middle class life may receive the equivalent of several middle class incomes and combine them to enjoy an upper class outcome. Rather than achieving life extension (because the goal of living for hundreds of years or longer will not be achieved during our lifetime), the Expandaverse provides life expansion into multiple simultaneous identities and alternate realities. Within these potentially expanded multiple incomes and combined consumption there is also a stronger dynamic alignment between people's goals, needs, desires and what is provided to them—described herein as "AnthroTectonics"—which operates within free market capitalism. This, as a Wealth System, may increase the volumes of economic creation and consumption by instantly multiplying the number of educated and successful people who may operate successfully, with global presence and delivered knowledge, throughout multiple modern economies—in brief, each expensive college degree may now be put to more uses by more identities, and on a larger worldwide scale. The Alternate Reality's Wealth System 24 diverges from the current reality's Industry 23 Wealth System with discontinuities 20 that occur during the recent digital era. This Alternate History thus posits a Wealth System 8 transition from the Industrial Wealth System 23 to Teleportal Presences & Knowledge 24 that is described elsewhere.

Culture System 9 (far right column of FIG. 1): The fourth of this Alternate Reality's views of human history is the dominant system for human culture 9 which is also part of this discontinuous stages because each Culture System also requires new forms of awareness and consciousness to come into existence. These differing sources of culture are illustrated in a right column of FIG. 1, titled Culture System 9 and are based on the communications technologies available in each system: The oldest, most direct and most physical is Local Cultures 25, which were based on the immediate lives that people experienced in extended families, tribes, city states, early empires, etc. Even though "Local Cultures" spans a wide range of governances from tribes to empires, the common element is what people experience directly and personally from their local environment (even if it is controlled by dominant dictators from a distance as in an empire such as Rome or China). A new Culture System started with the gradual rise of Mass Communications 26, starting slowly with the invention of the printing press in the 1400's, but gained increasing scope and media during the industrial revolution of the 1800's, and exploded into a global culture after the advent of electricity, radio, television, photography, movies, the telephone and other media in the 1900's—to culminate in an Internet era of global brands, mass-desired affluence and minute-by-minute twitter-blogger-24×7 global news and culture bombardment in the early 2000's.

A new Culture System 27 emerged in this Alternate History after it was recognized that digital technologies give both individuals and groups new means to control reality. The "discovery" of the Expandaverse, a new digital world, opened new social opportunities to enjoy from multiple identities, setting boundaries on each SPLS, etc.; which is what happened when a new cultural trend was discovered in the past (such as printing, telephone communications, the automobile, flying, etc.). Specifically, the ARTPM included an Alternate Realities Machine (herein ARM) which enabled multiple Self-Selected Cultures to emerge as an alternative to the, Mass Communicated Culture that had previously dominated reality. In the Expandaverse's Self-Selected Cultures each person could have a plurality of identities (as described elsewhere) wherein each identity could have one or a plurality of Shared Planetary Life Spaces (SPLS). Each SPLS is essentially "always on" so that identities ("I" which includes identities, people and groups), places ("P"), tools ("T") nand resources ("R")—herein IPTR—in it are everywhere and connected at all times. Each SPLS also has multiple boundaries that can be controlled, so each identity can include what it wants and keep out what it doesn't want. If I have a plurality of identities, and each of my identities can also have a plurality of Shared Lives Connections, and each of my identities may be everywhere that is connected at any time that I choose, and I can include and exclude what I want from each Planetary Life Space, then there is no shortage of choices; rather, I have many more choices than today BUT they are my choices and the parts of the mass culture that I don't want no longer imposes itself on me.

In a brief alternate history summary of the Self-Selected Culture enabled by this Alternate Realities Machine (ARM), it gives each person multiple human realities, and makes each of them a conscious choice: We can choose to create multiple identities to enjoy multiple lives simultaneously, and each identity can have one or a plurality of Shared Planetary Life Spaces, and each SPLS can copy or create different boundaries (e.g., its settings of what to include and exclude), and more. In some examples we can include everything in the current reality such as its total carpet bombing of branded media messaging; in some examples we can prioritize it and make sure what we like is included such as our interests like our family, close relatives and friends and our shared interests; in some examples we can limit it and make sure what we dislike is excluded such as entertainment that is too sexual or too violent for our children; in some examples we may optionally choose to be paid to include media sources that want our attention and need it for their financial prosperity like advertisers willing to pay us to see their messages. Additionally, when one person has a plurality of identities, and when each identity has a plurality of SPLS's, and when each SPLS has different interests and boundaries, that one person may enjoy multiple different human realities that each have worldwide "always on presence." In addition, analyses and reports on the outcome metrics from different "ARM reality settings" and their results may identify those that produce the greatest successes (how ever each person prefers to use available metrics to define that)—so that each identity can specify their goals, see the size of the gap(s) between themselves and those who reach them "best," and rapidly adopt the "best" reality settings from what is generally most or more successful. Because ARM settings results are widely and personally reported as gaps to reach one's goals, the "best realities" may be widely seen and copied—perhaps providing new means to raise income, success, satisfaction and happiness by trying and evolving self-selected human reality(ies) at a new pace and trajectory to determine and help people determine what works best for varied peoples and groups. With additional success guidance from this alternate reality's Active Knowledge Machine (herein AKM), these self-chosen realities may also be applied more successfully.

Who doesn't walk down the street and dream about what should be improved, what should be better, what we would really like if we could choose and switch into a more desirable new reality just because we want it? In the alternate timeline, a new Self-Selected Culture emerged because new types of choices became possible: New means enabled specifying a plurality of goals, seeing the alternate realities whose metrics showed how well they achieved them, copying successful ARM settings let people try new realities and test them personally, a collection of alternate realities that work better could be kept, and then each person could shift at will between their most successful realities by logging in and out as different identities. As people learned about this new Self-Selected Culture they modified each of their chosen realities by changing its SPLS boundary settings, and kept what worked best to achieve their various and different personal goals, then in turn distributed the "best alternate realities" for others to use to enjoy better and happier lives. Instead of one external ordinary public culture that attempts to control and shape everyone commercially, with the ARTPM's Alternate Realities Machine the alternate timeline gained multiple digital realities and individual control of each of them to enjoy the more successful and happier realities in which we would like to live.

Figure 2A:
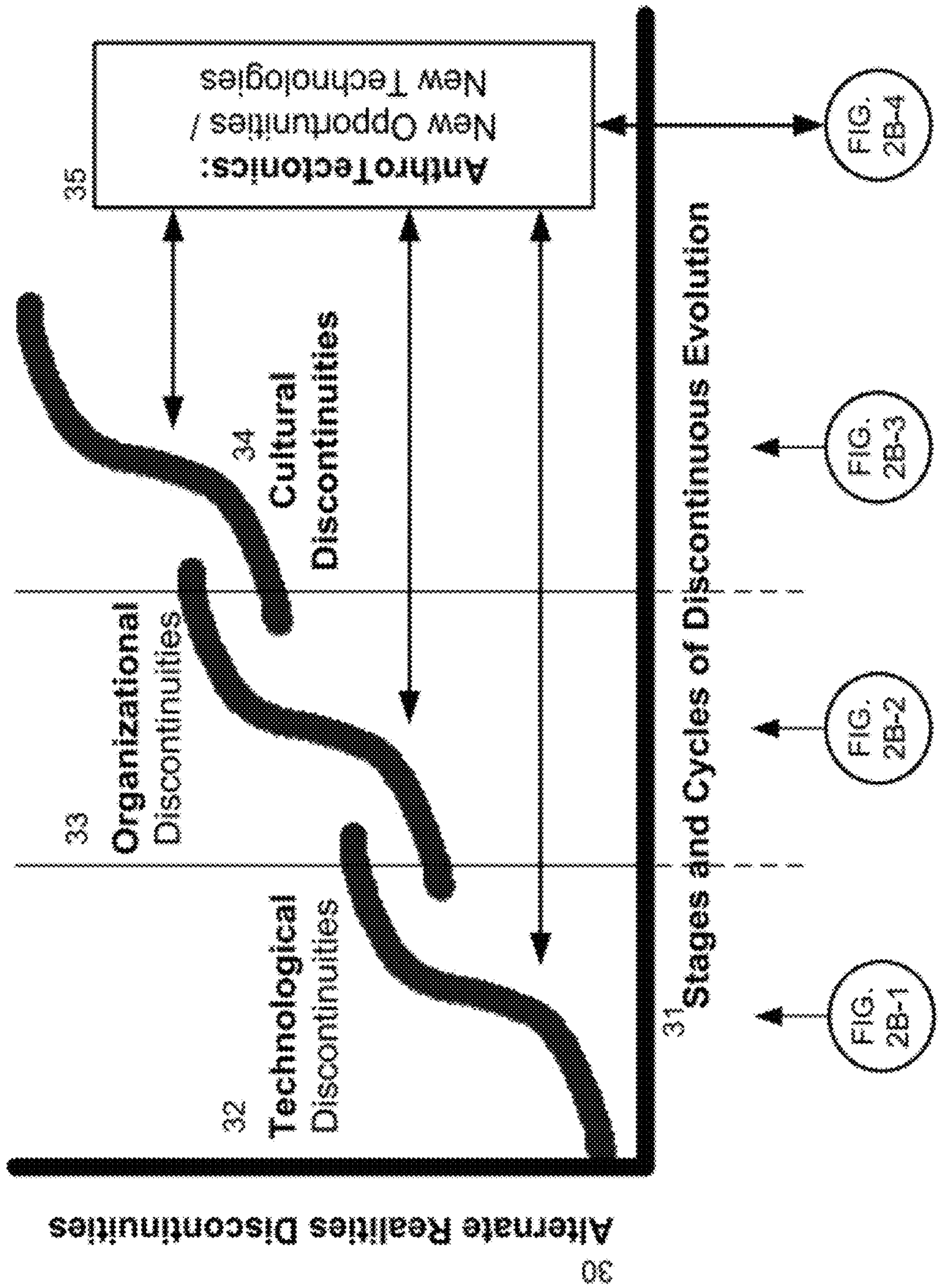
FIG. 2 is a graphical illustration that expands the period of digital discontinuities to show simultaneous and cyclical transformations in digital technologies, organizations and cultures, with AnthroTectonic shifts in numerous basic assumptions.
Figure 2B:
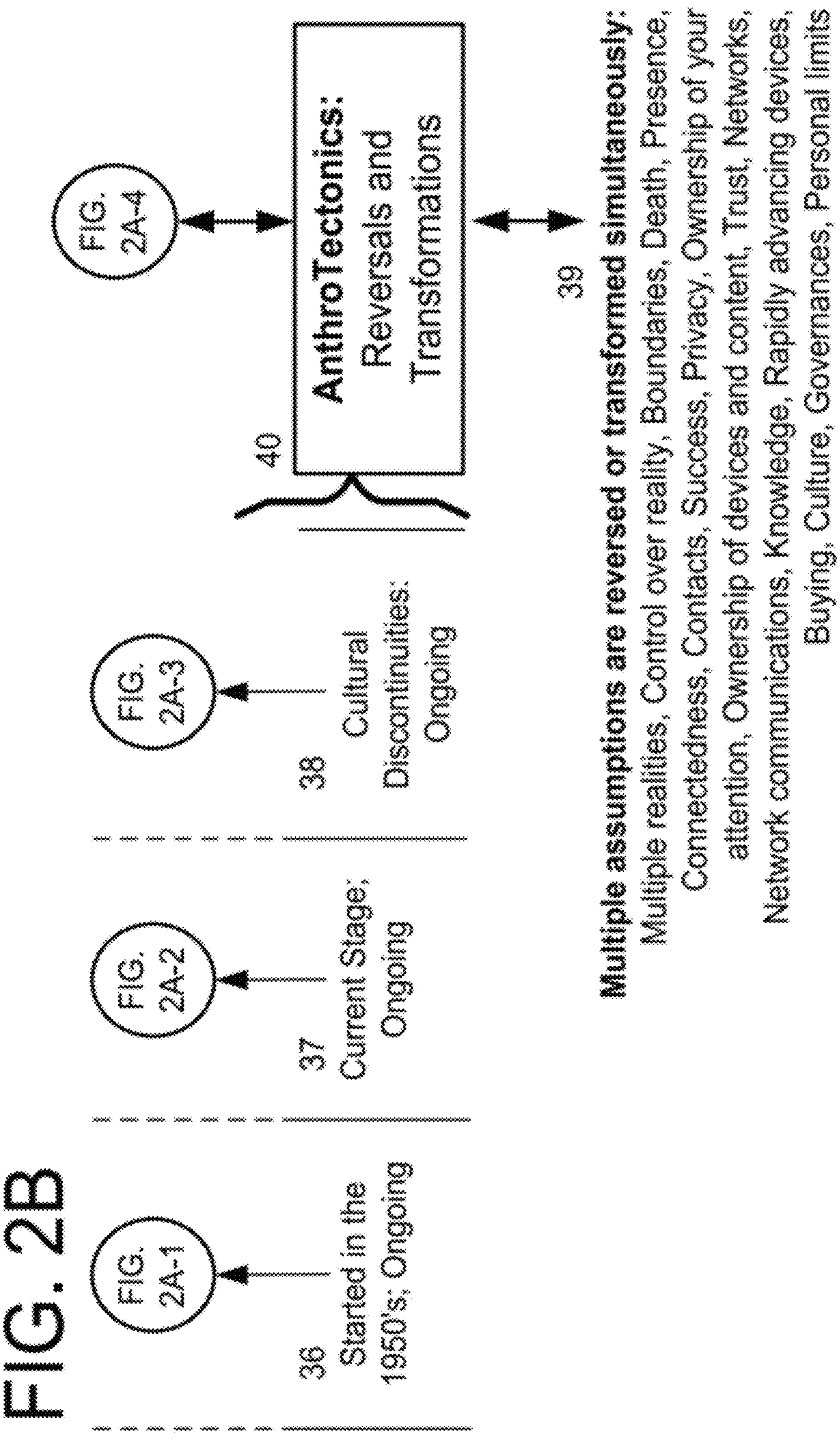

ARTPM DISCONTINUITIES: FIG. 2 is a magnification of the "AnthroTectonic" digital discontinuities 20 in FIG. 1 between the current reality's timeline and the Expandaverse's timeline. In FIG. 2, "AnthroTectonics Discontinuities: Simultaneous and Cyclical Transformations," three simultaneous and cyclical discontinuities are illustrated 30 31 including Technological Discontinuities 32 36, Organizational Discontinuities 33 37, Cultural Discontinuities 34 38, and their resulting new opportunities 35 and new technologies 35 that produce newer discontinuities 32 33 34 with successive cycles of transformations. In the Alternate Reality timeline the first is Technological Discontinuities 32 that expand in size and scope. Some examples from the current reality are digital content types that are now created and distributed worldwide by individuals or small independent collaborations as well as by organizations such as words, pictures, music, news, magazines, books, movies, videos, tweets, real-time feeds, and other content types—digital technologies made each of these faster and easier for a worldwide multiplication of sources to create, edit, find, use, copy, transmit, distribute, multiply, combine, adapt, remix, redistribute, etc. These discontinuities started in the 1950's and are ongoing and continuously expanding 36, and their total volume of views from new content sources may surpass the content products from large media corporations with notable examples such as the newspaper industry.

In the Alternate Reality timeline Technological Discontinuities 32 caused Organizational Discontinuities 33 that in turn alter organizations as many people, organizations, corporations, governments, etc. received numerous benefits from transforming themselves digitally. In some examples from the current reality, organizations have transformed themselves into digital communicators and digital content users (which includes entire industries, governments, non-profit organizations, etc.) that increasingly utilize digital networks, content and data in many forms, and as a result organizations have adapted their employees' skills, human resources, locations, functions (such as IT), teams, business divisions, R&D processes, product designs, organizational structures, management styles, marketing and much more. These are currently taking place and are ongoing into the foreseeable fuure 37.

In the Alternate Reality timeline the combination of Technological Discontinuities 32 and Organizational Discontinuities 33 cause the emergence of Cultural Discontinuities 34 that also expand in size and scope. Continuing the examples from the current reality—digital content—the culture in content industries like music, movies, publishing, cable television, etc. are shifting radically as their customers, audiences, products, services, revenues, distribution, marketing channels and much more are altered by the current reality's transformation of them into digital industries.

This is cyclical 35. Each of these—Technological Discontinuities 32, Organizational Discontinuities 33 and Cultural Discontinuities 34—provides both new opportunities 35 and ideas for new technologies 35 that may in turn create new advances that are also discontinuities 32 33 34. AnthroTectonics 40 is the result, which may be described by the geologic metaphor of a new mountain range: It is as if a giant flat continent existed but as the "geologic digital plates" collide between new technologies 32 36, new organizational adaptations 33 37 and cultural shifts 34 38 individual mountains rise up until there is an entire digital mountain range pushed high above the starting level—with new mountains continuing to emerge 35 40 from the pressure of that new mountain range 32 33 34.

These discontinuities 14 15 16 18 19 20 21 in FIG. 1 produce a new wealth system 8 24, new economic growth, new income: A better metaphor is adapting "the goose that laid a golden egg." While some newly laid golden eggs are cashed in 32 33 34, other eggs are hatched and grown into geese that lay more golden eggs 35 32 33 34, with those new geese 32 33 34 35 producing both more gold and more geese that lay more golden eggs 32 33 34 35 until wealth becomes abundant rather than scarce. This is a new kind of wealth system 8 24 in which the more we take from it, and the more we drive it, the more wealth there is—the traditional economist's ideas about scarcity have been made obsolete in the new AnthroTectonic Alternate Realities 12 21 24 27. Consider two sets of examples, the first of which is historic from the current reality: In Germany about 400,000 years ago the golden eggs of human hunting were laid with first known spears; in Asia about 50,000 years ago marked the earliest known start of the golden eggs of ovens and bows and arrows; in the Fertile Crescent about 10,000 years ago the golden eggs of farming and pottery were laid; in Mesopotamia about 5,000 years ago the golden eggs of cities and metal were laid;

in India about 2,000 years ago the golden eggs of textiles and the zero were laid; in China about 1000 years ago the golden eggs of printing and porcelain were laid; in Italy about 500 years ago the remarkably diverse Renaissance laid entire flocks of geese who themselves laid many new types of golden eggs of science, crafts, printing and the spread of knowledge; in England about 200 years ago the similarly diverse Industrial Revolution laid many more flocks of geese with golden eggs like steam engines, spinning jennys, factories, trains and much more; recently within the last few decades, an entire flock of digital geese laid the Internet's golden eggs and the many industries and new generations of golden eggs that have come from it.

In the current reality's history humanity created these numerous "geese" that "laid these golden eggs"—none of them existed until humans created them: Traditional economists thought of them as scarcities but in the Alternate Reality Timeline these were thought of in the opposite way because they expanded humanity's wealth and abundance. These golden eggs have familiar industry names like transportation, communications, agriculture, food, manufacturing, real estate, construction, energy, retailing, utilities, information technology, hospitality, financial services, professional services, education, healthcare, government, etc. But in the Alternate Reality Timeline when something new is created it is as if a golden egg were hatched and a new gosling is born to lay many more golden eggs 32 33 34 35. Transportation is one example of a flock of geese who lay "golden eggs" like ships, cars, trucks, trains and planes. Retail is another and its flock lays golden eggs like malls, furniture stores, electronics stores, restaurants, gas stations, automobile and truck dealers, building materials stores, grocery stores, clothing stores, etc. When geese mate they produce more offspring that lay more golden eggs such as when transportation mates with retail it produces "golden eggs" like warehousing, distribution, storage, shipping, logistics, supply chains, pipelines, air freight, seaports, courier services, etc. When the Alternate Reality Timeline uses global digital presence it accelerates economic growth by stimulating the production of many more golden eggs at ever faster rates—the take-up of helpful new ideas and products, at a worldwide scale, is the normal way people live with an ARTPM.

The AnthroTectonic component of the ARTPM's alternate reality harnesses this "golden eggs" model to drive new economic growth, prosperity and abundance by making this a set of simultaneous and parallel discontinuities 32 36 33 37 34 38 35 40. It consciously uses these to leap out of the economic scarcity model into a future of consciously stimulated advances and expanding abundance. For an example of how this works, in the current reality ownership and property expand into a major source of middle-class wealth and assets with the centuries-long development of real estate property ownership and mass construction industry, such as the mass marketing of houses in large suburban developments—which converted farmland into individually owned assets that appreciate in price. There is a visible connection between expanding the types of assets coupled with widespread ownership—when a new type of "golden egg" creates new types of properties in an existing or new industry, those new properties add to the available assets and the wealth of people and corporations. In the Alternate Reality Timeline new types of property are easy to create because Intellectual Property is real and the ARTPM follows that reality's established IP laws and rules (as described elsewhere outside of this document).

An example illustrates this from the ARTPM itself, and its alternate reality timeline: In some examples audiences for broadcast media may add boundaries and paywalls so they are paid for their attention, rather than providing it for free—so your attention becomes your property, what you choose to perceive becomes your property, and your conscious has new digital self-controls—your consciousness is your asset that you can control and monetize to produce more income. Similarly, in some examples the ARTPM lets individuals establish multiple identities, where each new identity may be a potential source of additional incomes so that each person may multiply their incomes and increase their wealth. Similarly, in some examples the ARTPM provides means for multiple "governances" (separate from and different from governments) where each governance may provide new activities that can scale up to meet various personal and social needs—which in turn expands the economic activities and contributions from governances. Similarly, in some examples the ARTPM's Teleportal Utility (herein TPU) provides consistent means to add multiple new types of devices and services, some of which may include Local Teleportals (LTPs), Mobile Teleportals (MTPs), Remote Teleportals (RTPs), Virtual Teleportals (VTPs), Remote Control Teleportals (RCTPs), and other new types of devices that may each add rapidly advancing presence and communication features and capabilities beyond existing devices. Similarly, in some examples the ARTPM's Active Knowledge Machine (herein AKM) provides dynamic knowledge with systems to deliver what we each need to know, when and where we need to know it—an infrastructure that delivers a growing range of human successes over the network rather than requiring each of us to achieve personal success independently and on our own. Similarly, in some examples many other types of property, capabilities and advances are provided by this discontinuous AnthroTectonic process 32 36 33 37 34 38 35 40, which together constitute the digital discontinuities 20 in FIG. 1 and wealth system 24 and culture system 27 of the Expandaverse 12.

In the Alternate Reality timeline AnthroTectonic Discontinuities are larger and often "reversals" of the assumptions that are common and widely accepted in our current reality. In the Alternate Reality Timeline's History some of the transformed organizations and transformed people realized that the new digital environment would become a cultural divergence that transforms everything. They consciously choose to help this divergence evolve for "economic growth" so that it would increase personal incomes, raise living standards and create more wealth faster; and for "the greater good" so that it would help large numbers of people choose and reach their personal goals by both personal means (such as multiple identities and/or boundaries) and collective means (such as governances). This helped those who promoted this, too, because those who led these divergences profited enormously from driving these AnthroTectonic Discontinuities. They placed themselves in worldwide leadership positions—they gained corporate and personal dominance at the center of a new and more successful worldwide civilization.

An example is corporate training: In the current reality corporate training started with staff who wrote processes as procedural manuals, and taught those in classrooms on a fixed schedule. With the Internet this evolved into webinars and distance learning that trains remotely located employees who no longer need to travel to a central facility. Today consistent corporate training can reach many employees in less time, and even be managed and delivered globally. In the Alternate Reality Timeline a growing range of knowledge is made dynamic and is delivered by the network based on each person's real-time actions and activities, so they receive the knowledge they need when and where they need it. A source of success is the network, with two-way interactions making learning and succeeding a normal part of doing and being—which is described in the ARTPM's Active Knowledge Machine (herein AKM).

How large are the Alternate Timeline's AnthroTectonic Discontinuities? To provide a new stage where human success is delivered as a normal process, and where the world is connected in new ways, the Expandaverse reverses or transforms many of the current reality's fundamental assumptions and concepts simultaneously 38:

Reality 39: FROM re.ality controls people TO we each control our own realities.

Boundaries 39: FROM invisible and unconscious TO explicit, visible and managed.

Death 39: FROM one life TO life expansion through multiple identities.

Presence 39: FROM where you are TO everywhere in multiple presences (as individual or multiple identities).

Connectedness 39: FROM separation between people TO always on connections worldwide.

Contacts 39: FROM trying to phone, conference or contact a remote recipient TO always present in a digital Shared Space(s) from your current preferred Device(s) in Use.

Success 39: FROM you figure it out TO success is delivered by the network.

Privacy 39: FROM private TO tracked, aggregated and visible (especially "best choices").

Ownership of Your Attention 39: FROM you give it away free TO you can charge for it if you want.

Ownership of Devices and Content 39: FROM each person buys these TO simplified access and sharing of commodity resources.

Trust 39: FROM stranger danger TO most people are good when instantly identified and classified.

Networks 39: FROM transmission TO identifying, tracking and surfacing behavior.

Network Communications 39: FROM electronic (web, e-store, email, mobile phone calls, e-shopping/e-catalogs, tweets, social media postings, etc.) TO personal and face-to-face, even if non-local. Knowledge 39: FROM static knowledge that must be found and figured out TO active knowledge that finds you and fits your need to know.

Rapidly Advancing Devices 39: FROM you're on your own TO two-way assistance.

Buying 39: FROM selling by push (marketing and sales) and pull (demand) TO interactive during use, based on your immediate actions, needs and goals.

Culture 39: FROM one common culture with top-down messages TO we choose our cultures and we set their boundaries (paywalls, priorities [what's in], filters [what's out], protection, etc.).

Governances 39: FROM one set of broad politician-controlled governments TO choosing your life's purposes and then choosing one or a plurality of multiple governances that help you achieve your life's goals.

Personal Limits 39: FROM we are only what we are TO we can choose large goals and receive two-way support, with multiple new ways to try and have it all (both individually and collectively).

In the Alternate Reality's History both reversals and transformations turned out to be central to humanity's success because the information that was surfaced, the ways people became connected, and a plurality of simultaneous transformations enabled a plurality of people and groups to connect, learn, adopt "what's best", and succeed in varied ways at a scale and speed that would have been impossible if the Alternate Reality's former timeline (our current reality) had continued.

Figure 3A:
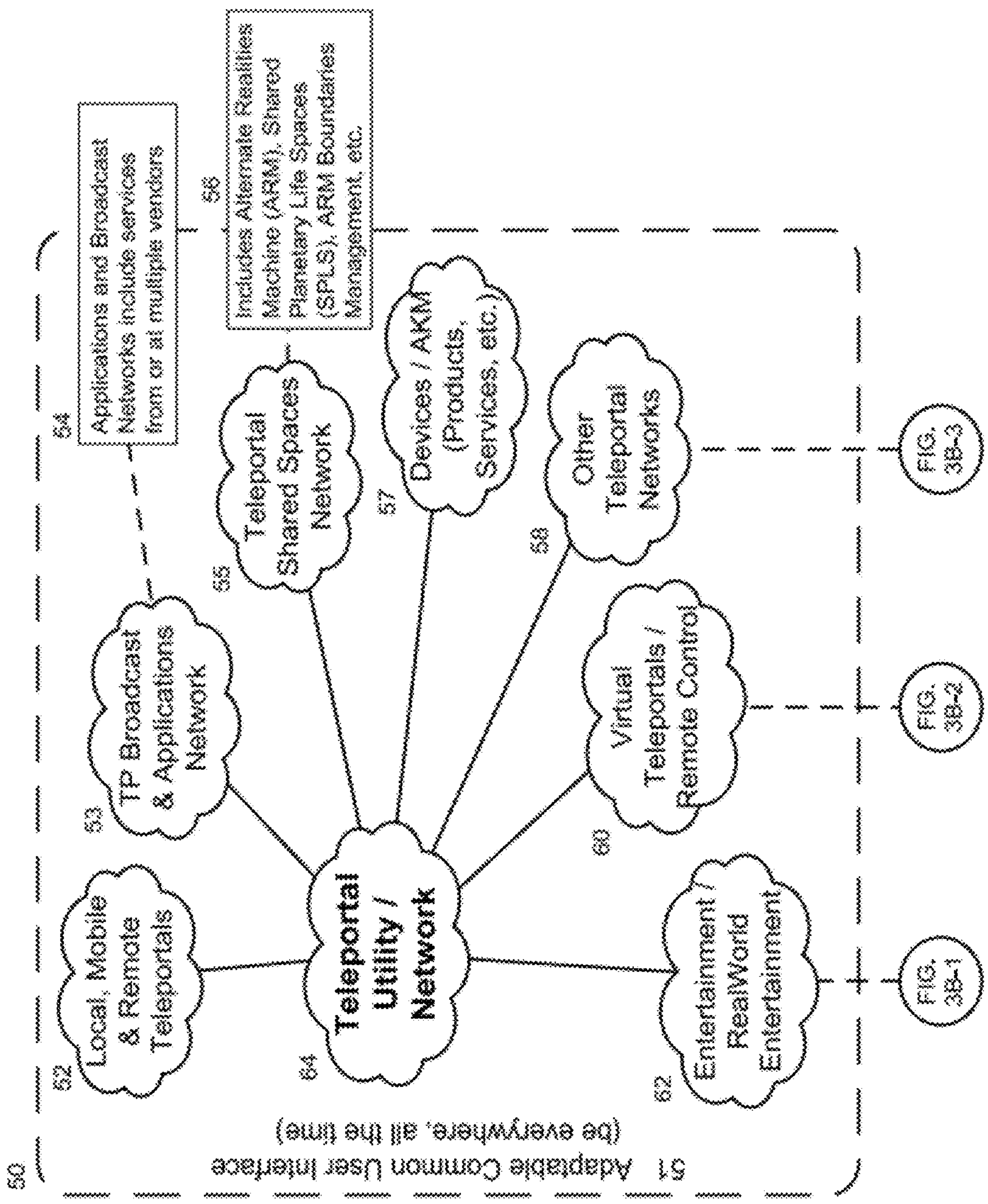
FIG. 3 is a pictorial diagram that briefly summarizes some components of an Alternate Reality Teleportal Machine (ARTPM).

TELEPORTAL MACHINE (TPM) SUMMARY: As illustrated in FIG. 3, "Teleportal Machine (TPM) Summary" this provides some examples that provide new capabilities for a Teleportal Machine 50 to deliver new devices, networks, services, alternate realities, etc. In some examples a Teleportal Utility (TPU) 64 includes providing new capabilities for the simultaneous delivery of new networks in some examples a Teleportal Network 52 (see below); in some examples a Teleportal Shared Space Network 55 (see below), in some examples a Teleportal Broadcast & Applications Network 53 (see below), in some examples Remote Control 61 of a plurality of devices and resources like LTPs 61, RTPs 61, PCs 61, mobile phones 61, television set-top boxes 61, devices 61, etc.; in some examples a range of other types of Teleportal Networks 58, in some examples Teleportal Social Network(s) 59, in some examples News Network(s) 59, in some examples Sports Network(s) 59, in some examples Travel Network(s) 59, and in some examples other types of Teleportal Networks 59; in some examples running a Web browser 59 61 that provides access to the Web, Web applications, Web content, Web services, Web sites, etc. as well as to the Teleportal Utility and any of its Teleportal Networks, services, features, applications or capabilities. In some examples it may also provide Virtual Teleportal capabilities 60 for downloading widgets or applications that attach or run a Virtual Teleportal to online devices 61 in some examples mobile phones, personal computers, netbooks, laptops, tablets, pads, television set-top boxes, online video games, web pages, websites, etc. In some examples a Virtual Teleportal may be accessed by means of a Web browser 61 which may be used to add Teleportaling to any online device (in some examples a mobile phone by means of its web browser and data service, even if a vendor artificially "locks out" or blocks that mobile phone from running a Virtual Teleportal). In some examples Teleportals may be used to access entertainment 62, in some examples traditional entertainment products 63 and in some examples multiplayer online games 63, which in some examples have some real world components 63 (as described elsewhere) and in some examples exist only in a game world 63. Further in some examples, by means of the AKM (Active Knowledge Machine) said TPU provides interactions with numerous types of devices 57, which are detailed in the AKM and its components.

Unlike the wide range of different and often complex user interfaces that prevent some customers from using some types, models, basic features, basic functions, or new versions of various devices, applications and systems—and too often prevents them from using a plurality of advanced features of said diversity of devices, applications and systems; said Teleportal Utility 64 52 53 58, Teleportal Shared Space(s) 55 56, Virtual Teleportals 60, Remote Control Teleportaling 60, Entertainment 62, Real World Entertainment 62, and AKM interactions 57 share an Adaptable Common User Interface 51 (see the Teleportal Utility below). The conceptual basis of said interface is "teleporting", that is, the normal and natural steps one would take if it were possible to step directly through a Teleportal into a remote location and interact directly with the actual devices, people, situations, applications, services, objects, etc. that are present on the remote side. Because said Teleportal's "fourth screens" can add a usable interface 51 across a wide range of interactions 64 52 53 55 57 58 60 62 that today require customers to figure out difficulties in interfaces on the many types and models of products, services, applications, etc. that run on today's "three screens" of PC's, mobile phones and navigable TVs on cable and satellite networks, said Teleportal Utility's Adaptable Common User Interface 51 could make it easier for customers to use said one shared Teleportal interface to reach higher rates of success and satisfaction when doing a plurality of tasks, and accomplishing a plurality of goals than may be possible when required to try to figure out a myriad of different interfaces on the comparable blizzard of technology-based products, services, applications and systems in the current reality.

As a result of said broad applicability of the Teleportal's "fourth screen" to today's "three screens", said Teleportal components 50 51 64 52 53 55 57 58 60 62 may provide substitutes and/or additions to current devices, networks and services that constitute innovations in their functionality, ease of use, integration of multiple separate products into one device or system, etc.:

Substitutes: Some Teleportal Devices, Networks and Platform (see below) may optionally be developed as products and services that are intended to provide substitutes for existing products and services (such as run on today's "three screens") when users need only the services and functionality that Teleportaling provides, in some examples:

PCs as accessible commodities (online) 60: In some examples PC's may be used from Teleportals by means of Remote Control 60 instead of running the PC's themselves. In some examples the purchase of one or a plurality of PCs might be replaced by network-based computing whereby the user runs Web PC's and PC applications online by means of physical and/or virtual Teleportals 60. In some examples said PC's may be run online by means of remote control when using a Teleportal(s) 60. This is true for the potential replacement of home PC's 60, laptops 60, netbooks 60, tablets 60, pads 60, etc. In some examples these devices may be replaced by utilizing unused RCTP controllable devices online 60 from other Teleportal users at some times of the day or evening. In some examples these devices may be unused overnight so might be provided as accessible online resources 60 for those in parts of the world where it is morning or afternoon, and similarly devices in any part of the world might be made available overnight and provided online 60 to others when they are not being used. In some examples individuals and companies have unused PCs or laptops with previously purchased applications software that are not the latest generation and are currently not in use, so these might be provided full-time online 60 to those who need to use a PC as a commodity resource. In some examples these devices may be provided for a charge 60 and provide their owners income in return for making them available online. In some examples these devices might be provided free online 60 to a charity who provides access to PC's worldwide such as to school children in developing countries, to charities that can't afford to buy enough PC's, etc.

Some mobile phone and landline calling services 55: In some examples one or a plurality of mobile and landline telephone services might be replaced by Teleportal Shared Space(s) 55, whether from a fixed location by means of a Local Teleportal (LTP) 52, from mobile locations by means of a Mobile Teleportal (MTP) 52, by means of Alternate Input Devices (AIDs) 55/Alternate Output Devices (AODs) 52 60, etc.

Mobile phone or landline telephone services: There are obvious substitutions such as substituting for telephone communications 55. In some examples some phone applications like texting 53 may be run on a TP Device 52, by means of a Virtual Teleportal 60, in some examples texting 53 may be run on a Web browser in a mobile phone 61, in some examples texting 53 may be run when a Web browser 61 in turn runs a Virtual Teleportal 60 that provides said services substitution), run by online TP applications 53, etc. In some examples location-based services such as navigation and local search may be replaced on Teleportals 53 (again with TP-specific differences). In some examples telephone services in some examples telephone directories, voice mail/messaging, etc. may have Teleportal parallels 53 (though with TP-specific differences).

Cable television 53 60 and satellite television 53 60 on Teleportals instead of on Televisions: In some examples cable television set-top boxes, or satellite television set-top boxes (herein both cable and satellite sources are referred to as "set-top boxes"), may be used from Teleportals by means of Remote Control 60 instead of running the output signal from the set-top boxes on Television sets. In some examples the purchase of one or a plurality of cable and/or satellite television subscriptions might be replaced by network-based viewing whereby the user runs set-top boxes online by means of physical and/or Virtual Teleportals 60. In some examples said set-top boxes may be run and used online by means of remote control when using a Teleportal(s) remotely 60. This is true for the potential replacement of home televisions 60, cable television subscriptions 60, satellite television subscriptions 60, etc. In some examples these set-top box devices may be replaced by utilizing unused devices online 60 from other Teleportal users at various times of the day or night. In some examples these set-top boxes may be unused during late overnight hours so might be provided as accessible online resources 60 for those in parts of the world where it is a good time to watch television, and similarly set-top boxes in any part of the world might be made available during overnight hours and provided online 60 to others when they are not being used—which may help globalize television viewing. In some examples individuals and companies have set-top boxes with two or more tuners where an available tuner might be run remotely to record a television show(s) for later retrieval or playback. In some examples television may be accessed and displayed by means of IPTV 53 (which is television that is Internet-based and IP-based). In some examples a teleportal may view television shows, videos or multimedia that is available on demand and/or broadcast over the Internet by means of a Web browser 61 or a web application 61.

Services, applications and systems: Some widely used online services might be provided by Teleportals. Some examples include PC-based and mobile phone-based services like Web browsing and Web-based email, social networks access, online games, accessing live events, news (which may include news of specific categories and formats such as general, business, sports, technology, etc. news, in formats such as text, video, interviews, "tweets," live observation, recorded observations, etc.), location-based services, web search, local search, online education, visiting entertainments, alerts, etc.—along with advertising and marketing that accompanies any of these. These and other services, applications and systems may be accessed by means such as an application(s), a Web browser that runs on physical Teleportals, runs on other devices by means of Virtual Teleportals, runs on other remote Teleportals by means of Remote Control Teleportaling, etc.

New innovations: Entirely new classes of devices, services, systems, machines, etc. might be accessed by means of a Teleportal(s) or innovative new features on Teleportals, such as 3D displays, e-paper, and other innovative uses described herein.

Additions to Subsidiary Devices: Alternatively, vendors of PCs, mobile phones, cable television, satellite television, landline phone services, broadband Internet services, etc., may utilize ARTPM technology(ies) (it's IP [Intellectual Property]) and Utility(ies) to add Teleportal features and capabilities to their devices, networks and/or network services—whether as part of their basic subscription plan(s), or for an additional charge by adding it as another premium, separately priced service(s).

Figure 4:
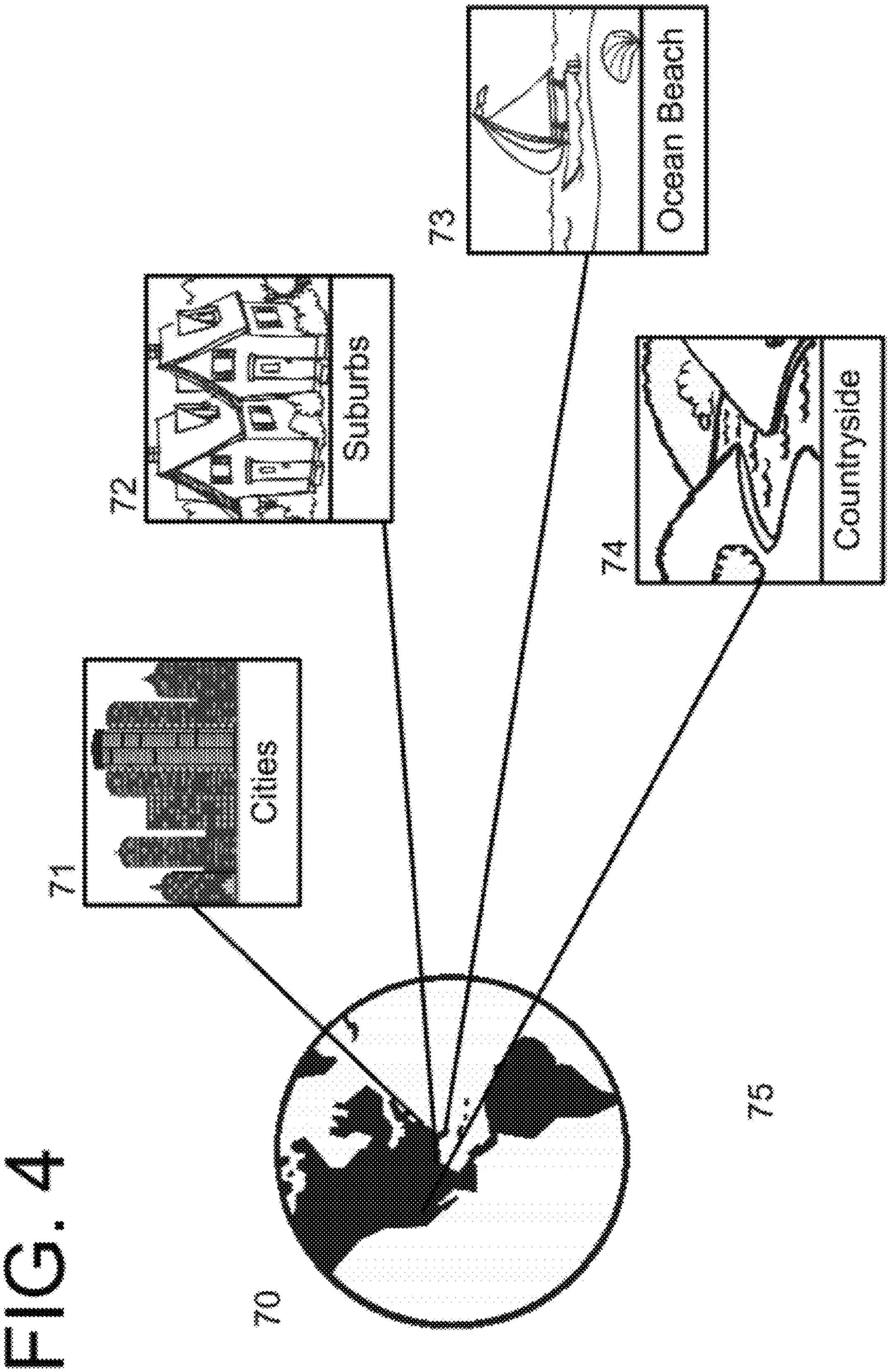
FIG. 4 is a pictorial diagram that illustrates physical reality (prior art).

PHYSICAL REALITY—PRIOR ART TO THIS ALTERNATE REALITY: The current reality is physical and local and it is well-known to everyone. As depicted in FIG. 4, "Physical Reality (Prior Art)," the Earth 70 is the normal and usual physical reality for all human beings. When you walk out on a public city street 71 you are present there and can see everything that is present on the street with you—all the people, sidewalks, buildings, stores, cars, streetlights, security cameras, etc. Similarly, all the people and cameras present on that street at that time can see you. Direct visual and auditory contact does not have any separation between people—everyone can see each other, talk to each other, hear what any person says if they are close enough to them, etc. Physical reality is the same when you go to the airport to get on a plane 75 to fly to an ocean beach resort 73. When you arrive at the airport and are present in it you can see everyone and everything there, and everyone who is at the airport and in the same space as you can see you. Physical reality stays the same after you go through the airport's security checkpoint and are in the more secure area of your plane's boarding gate—again, in the place you are present you can see and hear everyone and everything, and everyone and everything can see and hear you. Physical reality stays the same on the plane during the flight 75, when you arrive at your vacation beach resort 73, and when you walk on the beach. When you walk through the resort, go down to the beach and stand gazing over the ocean at the sunset 73 everyone who is present in the same physical reality as you can see you and talk to you. No matter where you travel on the Earth 70 by walking, driving a car or flying in a plane physical reality stays the same. The state of things as they actually exist is when you go into any public place anywhere, at any time, you can see everyone and everything that is there, and if you are close enough to a person you can also hear that person—and in every public place you are present everyone who is there can see you, and anyone who is close enough to you can also hear you.

Physical reality is the same in private spaces such as when you use a security badge to enter your employer's private company offices in the city 71. Once you enter your company's private offices everyone who is in the same space as you can see you regardless of whether you are in a receptionist's entry area, a conference room, a hallway, a cubicle, an R&D lab, etc.—and in each of these private spaces you can see everyone who is in each place with you. If you want to enter anyone's even more private space you can simply walk to their open door or cubicle entry and knock and ask if they have a minute, or if you see the person in a hallway you can simply stop and talk to him or her.

Physical reality stays the same in your most private spaces such as when you drive home to your house such as a home in the suburbs 72. If anyone is at home such as your family, and you are in the same room with any of them you can see and hear them and they can see and hear you. In this most private of spaces you can see and be with everyone who is in your house but not with you simply by walking down the hall and going into the room they are in.

Some issues about physical reality are helpful. We have long had the implicit assumption that using a telephone, video conference, video call, etc. involves first identifying a particular person or group and then contacting that person or group by means such as dialing a phone number, entering a list of email addresses, entering a web address, etc. Though not expressed a digital contact was person-to-person (or group to group in a video conference), and it was different than being simultaneously present in Physical Reality—you need to contact someone to make a digital connection. Until you make a selection and a contact you cannot see and hear everyone and everyone cannot see or hear you.

Another issue is from fields such as science, ethics, morality, politics, philosophy, etc. This is also an implicit assumption that underlies many fields of human activity—given what we know about the way the world is, we know this is not an ideal world and it has room for improvements, so what should those improvements be? It doesn't matter whether our recognition of this implicit assumption comes from the fields of science, ethics, morality, politics, philosophy, sociology, psychology, simply talking to someone else, or many other areas of society or life. As we stand anywhere on the Earth and look about us at our physical reality, including all the people, places, tools, resources, etc. we can see from the many things people have done there is a widely practiced implicit assumption that we can make this a better place—whether we are improving it for ourselves, for other people, for the things around us, or for the environment in which everything lives.

This recitation starts with its "feet on the ground" of physical reality and moves immediately to the two issues just raised: First, why doesn't digital reality work the same as physical reality? Suppose an Alternate Reality made digital reality work the same as physical reality—you see everywhere, every one, and are present with everything connected. In the ARTPM's digital reality you have an immediate, open, always on connection with the available people, places, tools, resources, etc. Even more interesting as a transformation, everyone and everything (including accessible tools and resources) can see you, too. The ARTPM calls this a Shared Planetary Life Space (SPLS), and just as in physical reality there are both public SPLS's in which everyone is present, and private SPLS's where you define the boundaries—and you can even have secret SPLS's where the boundaries are even more confidential. Just as when you walk out on a public physical street and see everything and everything sees you, when you enter a PUBLIC Shared Planetary Life Space you have an immediate open connection with everyone and everything that is available in that public digital SPLS. And just as when you walk into a private physical place such as your home or a company's private offices, when you enter a PRIVATE Shared Planetary Life Space you have an immediate private connection with everyone and everything that is a member of that private SPLS.

While it is a substantial change to make digital reality parallel physical reality, the real question is the second issue, that the world as it is not ideal and has room for improvements, so what should those improvements be? This Alternate Reality's answer is the ARTPM. Digital reality is designed by people so people can make it into what they want and need. As a starting point, can that be more meaningful and valuable then what has become known as virtual reality, digital communications, augmented reality, and various applications and digital communications achieved with telephone land lines, PCs, mobile phones, television set-top boxes, digital entertainment, etc.

This Alternate Reality has a digital reality that in some examples has the explicit goal of helping us become better in multiple ways we want and choose. In addition to Shared Planetary Life Spaces it includes self-improvement processes so a normal part of digital presence is receiving Active Knowledge about how to succeed, which may include seeing its current state, knowing the "best choice(s)" available, and being able to switch directly and successfully to what's best—to make your life better and more successful sooner.

Your digital presence includes immediate opportunities to do more, want more, and have more.

The cultural evolution of this Alternate Reality has a divergent trajectory: "If you want a better reality, choose it."

As an addition to our Physical Reality (prior art), this recitation introduces the Expandaverse and it's technologies and components—a new design for an Alternate Reality, collectively known as the Alternate Reality Teleportal Machine.

Figure 5:
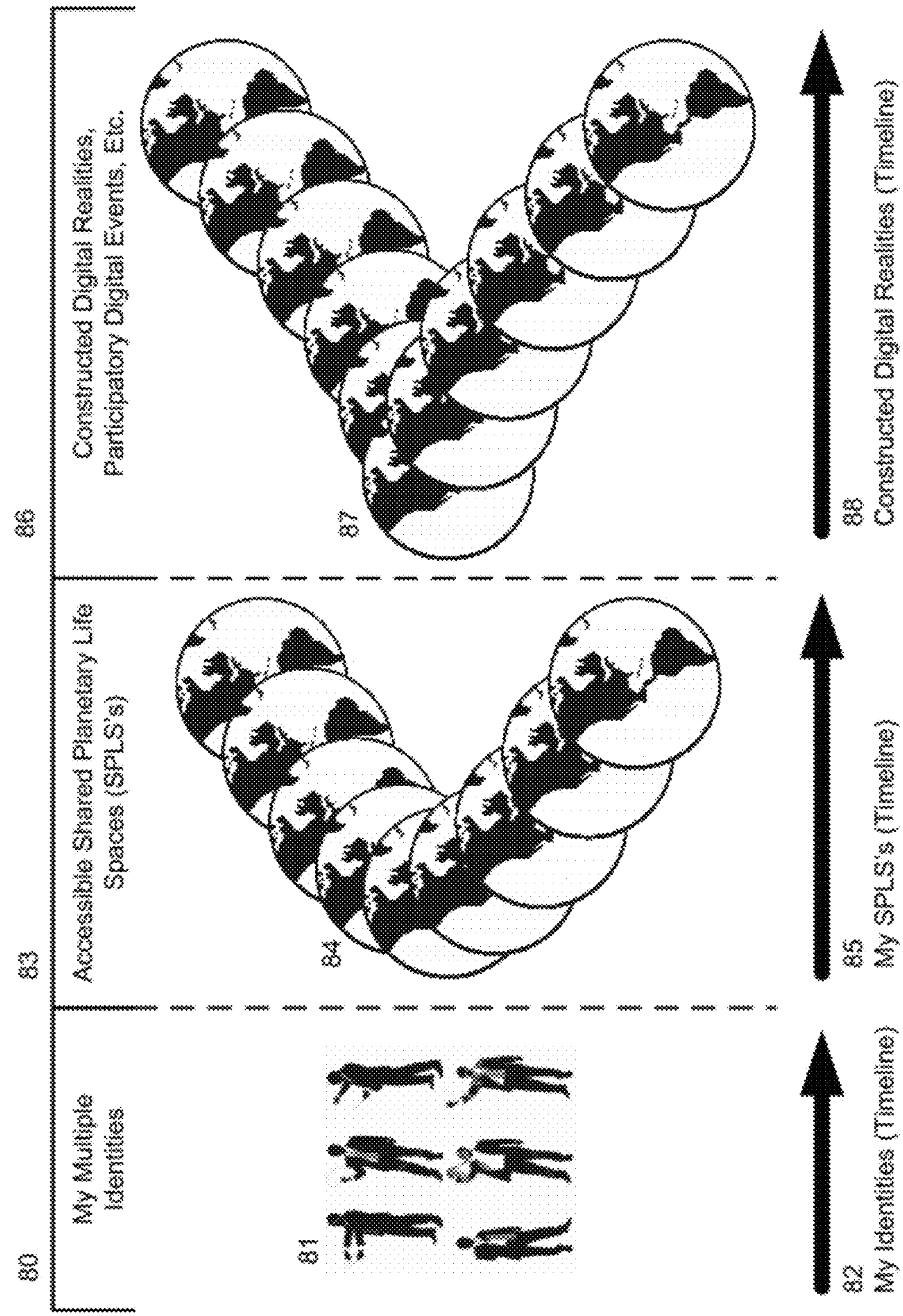
FIG. 5 is a pictorial diagram that illustrates how a single person may choose to create a growing number of alternate realities (Expandaverse), some of whose options include multiple identities; multiple Shared Planetary Life Spaces (SPLS's); and utilizing multiple constructed digital realities, digital presence events, etc.

SOME ALTERNATE REALITY TRANSFORMATIONS—MULTIPLE IDENTITIES AND DIGITAL PRESENCES: Turning now to FIG. 5, "Alternate Reality (Expandaverse)," this recitation includes a TP Shared Spaces Network (herein TP SSN), multiple identities 80 81, an Alternate Realities Machine (herein ARM) with Shared Planetary Life Spaces 83 84, boundaries management to control those SPLS's, and ARTPM components that relate generally to providing means for individuals, groups and the public to fundamentally redefine our common human reality as multiple human identities, multiple realities (via ARM management of the boundaries of Shared Planetary Life Spaces, or SPLS), and more—so that our chosen digital realities are a better reflection of our needs and desires. In addition, this includes accessible constructed digital realities and participatory digital events that may be utilized by various means described herein such as streamed from RTPs (Remote Teleportals); digital presence at events such as by PlanetCentrals, GoPorts, alert systems, third-party services; and other means that relate generally to providing means for enjoying, utilizing, participating, etc. various types of constructed digital realities as described herein.

In our current reality physical presence is more important and digital contacts are secondary. The ARTPM diverges from our current reality which is physical, and where our primary presence is in a common current reality—the ARTPM provides means for one or a plurality of users to reverse the current physical presence-first priority so that an SPLS provides closer "always on" connections to both people (such as individuals or identities) and parts of the world (such as unaltered or digitally constructed) that are most interesting and important to us, regardless of their locations or whether they are people, places, tools, resources, digital constructs, etc.—it is a multi-dimensional Alternate Reality from what local physical reality has been throughout human evolution and history.

In some examples the ARTPM embodies larger goals: A human life is too short—we die after too few decades. Many would like to live for centuries but this is medically out of reach for those alive today. Instead, the ARTPM provides means to extend life within our current life spans by enabling people to enjoy living multiple lives 80 81 82 at one time, thereby expanding our "life time" in parallel 82 rather than longitudinally. In brief, we can each live the equivalent of more lives 80 81 within our limited years 82 85 in more "places" 88 by having multiple identities 81, even if we are not able to increase the number of years we are alive.

In some examples another larger goal is the success and happiness of each of our identities 80 81 82. Each identity 81 may create, buy, control, manage, participate in, enjoy, experience, etc. one or a plurality of Shared Planetary Life Spaces 83 84 85 in which they may have other incomes, activities or enjoyments; and each of their identities 80 81 may also utilize ARTPM components in some examples the Active Knowledge Machine (herein AKM), reporting of current "best choices," etc. to know more about what they need to do to have more successful lives in the emerging digital environments 85 88. Thus, one person's multiple identities may each become better at learning, growing, interacting, earning, enjoying more varied entertainments, being more satisfied, becoming more successful, etc.—as well as better connected with the people, places, tools and resources that are most important to them. In addition to the SPLS's 83 84 85 and the constructed digital realities 86 87 88 and participatory digital events 86 87 88 that are controlled and/or enjoyed by each identity 80 81 82, a person's identities 80 81 may be present in other SPLS's 83 84 85 and/or in constructed digital realities 86 87 88 and/or in participatory digital events 86 87 88 that may each be public (such as a Directory(ies), rock concert, South Pacific beach, San Francisco bar, etc.), or private (such as an extended family, a company where a person works, a religious institution such as a local church or temple, a private meeting, an invitation-only performance, a privately shared experience, etc.).

Therefore, in some examples it is an object of the Alternate Realities Machine to introduce a new digital paradigm for human reality whereby each person may control their identities 80 81 82, their SPLS reality(ies) 83 84 85, and their digitally realities 86 87 88 and presence at participatory digital events 86 87 88 by utilizing one or a plurality of means provided by the ARTPM—means that diverge from our current historical reality by controlling our identities 80 81 82, controlling our realities 83 84 85 86 87 88, and ultimately may give us control over reality. In a brief summary, this new digital paradigm may be simple: "If you want a better reality, choose it."

Figure 6A:
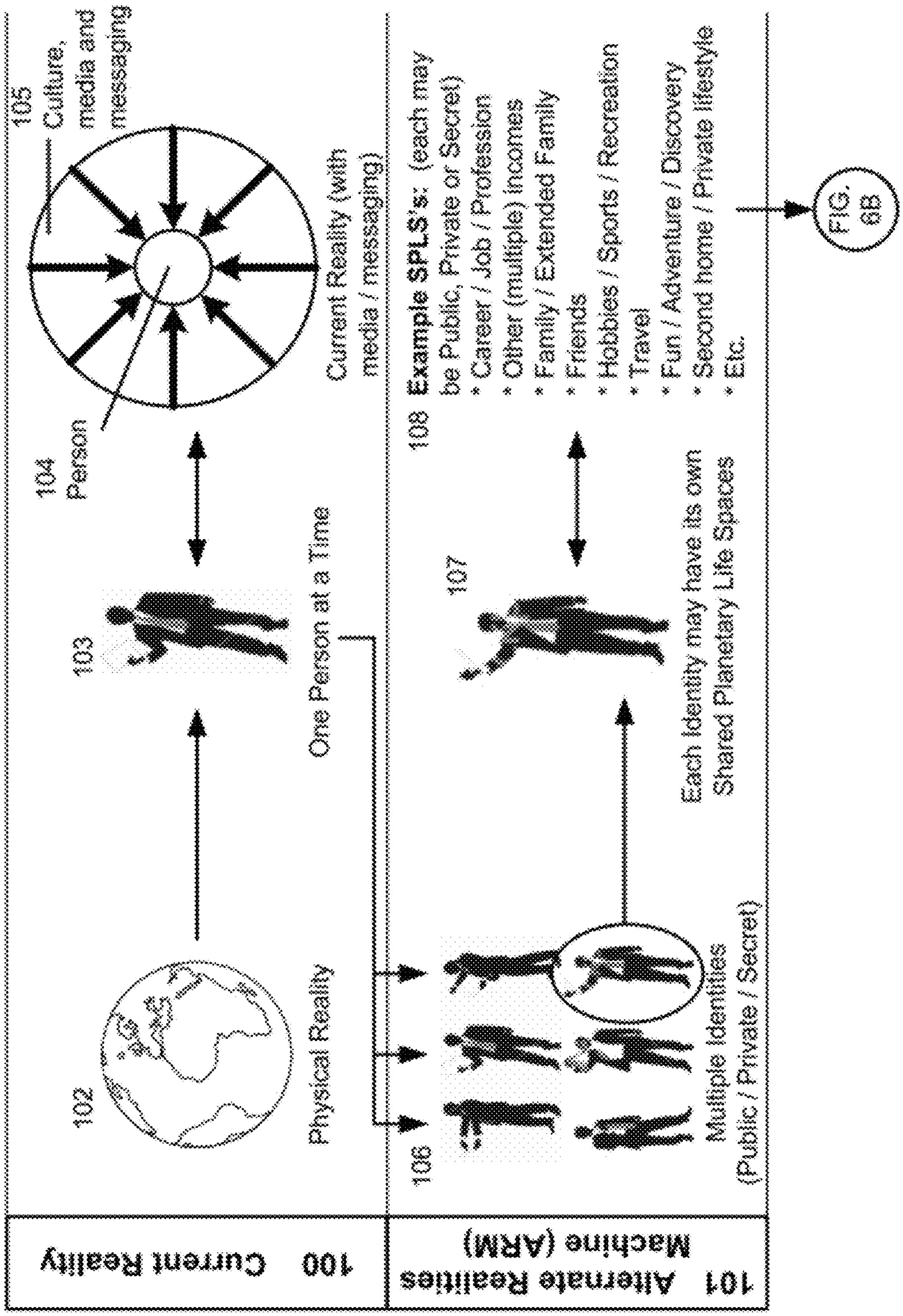
FIG. 6 is a pictorial diagram that illustrates some components and processes of the ARTPM's Alternate Realities Machine (ARM), especially introducing ARM boundaries and boundaries management.
Figure 6B:
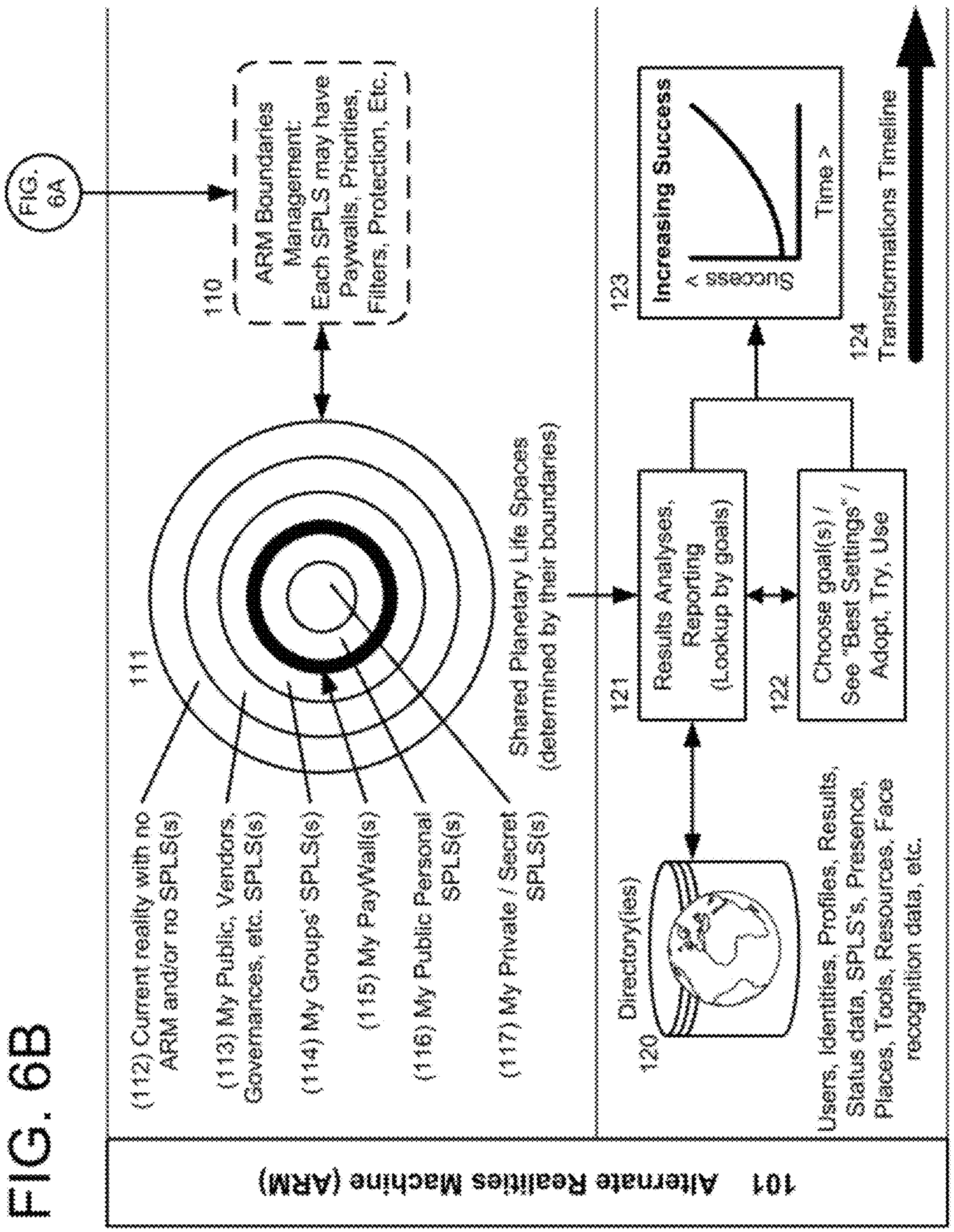

SUMMARY OF THE ALTERNATE REALITIES MACHINE (ARM): Turning now to FIG. 6, "Teleportal Machine (TPM) Alternate Realities Summary: Alternate Realities Machine (ARM)," some components of the ARM, which is a component of the ARTPM, is illustrated at a high level. Said illustration begins with the Current Reality 100 in which the Earth 102 provides Physical Reality 102 for one person at a time 103. As our current mass communications culture and Digital Era emerged one characteristic of the Current Reality 100 is large and growing volumes of public culture 105, commercial advertising 105, media 105, and messaging 105 that floods each person 104 103 and competes for each person's attention, brand awareness, desires, emotional attachments, beliefs, actions, etc. Our expanding waistlines—the worldwide "growth" of obesity—is perhaps the most visible evidence of the success of the common culture in capturing the "mind share" of large numbers of people. In sum, many facets of the ordinary culture 105 and its imposed advertising 105, messages 105, and media 105 attempts to dominate a large and growing part of each person's 104 103 attention, desires and activities.

In a brief summation of some examples, the Alternate Realities Machine (ARM) 101 enables departure from the current common reality 100 by providing multiple and flexible means for people and groups to filter, exclude and protect themselves from what is not wanted, while including what is wanted, and also protecting themselves both digitally and physically. Additionally, the ARM provides means (optional TP Paywalls) so that individuals and groups may choose to earn money by permitting entry by chosen advertisers and/or people which are willing to pay for attention and "mind share." In a brief and familiar parallel, people typically use a television DVR (Digital Video Recorder) to skip advertisements and record/watch only the shows and news they want, along with some "live" television that they would like to see. Similarly, the ARM provides what in some examples could be called an "automated digital remote control" (its means are control over each SPLS's boundaries) so each separate SPLS reality excludes what we don't want and includes what we like, plus it may include optional paywalls and protections, so we no longer need to blindly accept everything the ordinary current reality attempts to impose on us. In fact, by using the ARM in some examples we can selectively filter the common mass culture to make it more like the individually supportive, positive, safe and successful culture that some might like it to be.

The ARM's means for this, at a high level and in some examples, includes each person 103 establishing one or a plurality of identities 106 (each of which may be a public identity, a private identity, or a secret identity). In turn, each identity 107 may have one or a plurality of Shared Planetary Life Spaces 111. In some examples, one identity 107 may have separate or combined SPLS's for various personal roles, activities, etc., with separate or combined SPLS's for personal interests such as a career 108 with professional associations, a particular job 108, a profession 108 with professional relationships, other multiple incomes 108, family 108, extended family 108, friends 108, hobbies 108, sports 108, recreation 108, travel 108, fun 108 (which may also be done by separate public, private, and/or secret identities), a second home 108, a private lifestyle 108, etc.

Each SPLS defines its "reality" by controlling boundaries 110 and in some examples ARM Boundaries Management 110 111 112 113 114 115 116 117 is employed, which has a plurality of example boundaries 110 to illustrate the use of boundaries to limit, prioritize and provide various functions and features for separate and different realities. In some examples these SPLS boundaries include priorities 110 to include and highlight what is wanted, filters 110 to exclude what is not wanted, (optional) paywalls 110 to require and receive payment for providing one's attention to certain elements of the common culture, and/or protections 110 which may be used to provide both digital and physical protection (as well as to protect various devices from theft).

In some examples these boundaries define a range of types of SPLS's, some of which are included in a high-level visualization 111 that starts at the broadest public reality 112 and moves to the most private, personal and non-public reality 117. Starting broadly, the current public reality remains 112 with no ARM 101, no identities 106 107, and no SPLS's 108 110. Within that, ARM Boundaries Management 110 provides multiple levels of controls and multiple types of SPLS's 113 114 115 116 117, which in some examples include: Public SPLS's 113 which are various manifestations of the ordinary public culture and provide only limited filters or protections, in some examples a state's citizens 113, in some examples a vendor's customers 113, in some examples a social network's members 113, etc. The next level is Groups' SPLS's 114 which in some examples may include the groups to which that person is a member 114, in some examples each of those groups' SPLS's, and filters or paywalls they have applied to their SPLS's; in some examples a company where one works 114, in some examples a governance that an identity has joined 114, in some examples a church or temple where one is a member 114, etc.; these group SPLS's would include the boundaries each group decides it wants, which in some examples would be more restrictive and confidential for many corporations 114, more values-based or behavior-based for religious institutions 114, etc. The next levels are personal SPLS's 115 116 117 and these include in some examples one's public personal SPLS's 116 in some examples one's private and/or secret SPLS's 117 (if any), as well as any paywall(s) 115 that one might add; these would use whatever combination, of filtering 110, priorities 110, paywall(s) 110, and protections 100 each identity would like, with some identities employing more intense, different, or varied boundaries than others.

In some examples broad learning of "what's best" 121 122 with rapid distribution 121 122 and adoption of that 123 may be employed to help people achieve increasing success 123 over time 124. This would shift control over today's current singular reality to individual choices of multiple new and evolving trajectories. The pace of this would be affected by these new realities' capabilities for delivering what people would like 121 122 123 124, as it would be affected by the excessive level and poor quality of messaging from the ordinary public culture 105 104, as it would be affected by people's desires to create and live in their desired alternate realities 106 107 108 110—so this is likely to match what the people in each historical moment want and need 123, as well as evolving over time 124 to reflect their expanding or diminishing desires. This "Expandaverse" growth in human realities is based on another component of the ARM (Alternate Realities Machine) which is (are) Directory(ies) 120 that include public, group, private and other Directories 120. These may be "mined" 121 and analyzed 121 for various metrics and data 120 that may include users 120, identities 120, profiles 120, results 120, status data 120, SPLS's 120, presence 120, places 120, tools 120, resources 120, face recognition data 120, other biometric data 120, authorizations or authentications data 120, etc. Since SPLS metrics may be tracked and reported 121 (such as what is most successful, effective, satisfying, etc.) in some examples it is possible to choose one's goals 122 and look up these analyses 121, or perform them as needed 121, to determine "what's best" and the characteristics, choices, settings, etc. used to achieve that. Because it is possible to save, access, copy, install, and try those choices, ARM identity settings 106 107, SPLS configurations 108 110 115 116 117, etc. in some examples this enables rapid learning, setup and use of the most effective or popular ways to apply identities for various types of goals, including their boundaries settings such as priorities 110, filters 110, paywalls 110, protections 110, etc.

An important distinction is the potential scale and volume of manageable alternate realities that may be enabled by the ARM 101. In some examples this may be far more than a simple division of the one current reality into a few variations—because each person 103 104 may have one or a plurality of identities 106 107 (which may be changed over time); and because each identity may have one or a plurality of SPLS's 108 110 111 112 113 114 115 116 117 (which may be changed over time); and because each identity may be public, private or secret. It is entirely conceivable that an identity may be created to control one SPLS's boundaries so that this "reality" includes only one other person, a place or two, a couple of communications tools and financial resources, and everything else excluded—a digital world created for one's true love so two people could find happiness and, while together, make their way in the larger world as a unique and special couple. With the ability to find 121 122, copy 122 and re-use 122 settings any types of identities, lifestyles or personal goals that can be expressed 106 107 108 1120 111 113 114 115 116 117 may become popular and copied widely 122, enabling both personal 115 116 117 and cultural 112 113 114 growth in multiple trajectories 124 that are unimaginable today.

Figure 7:
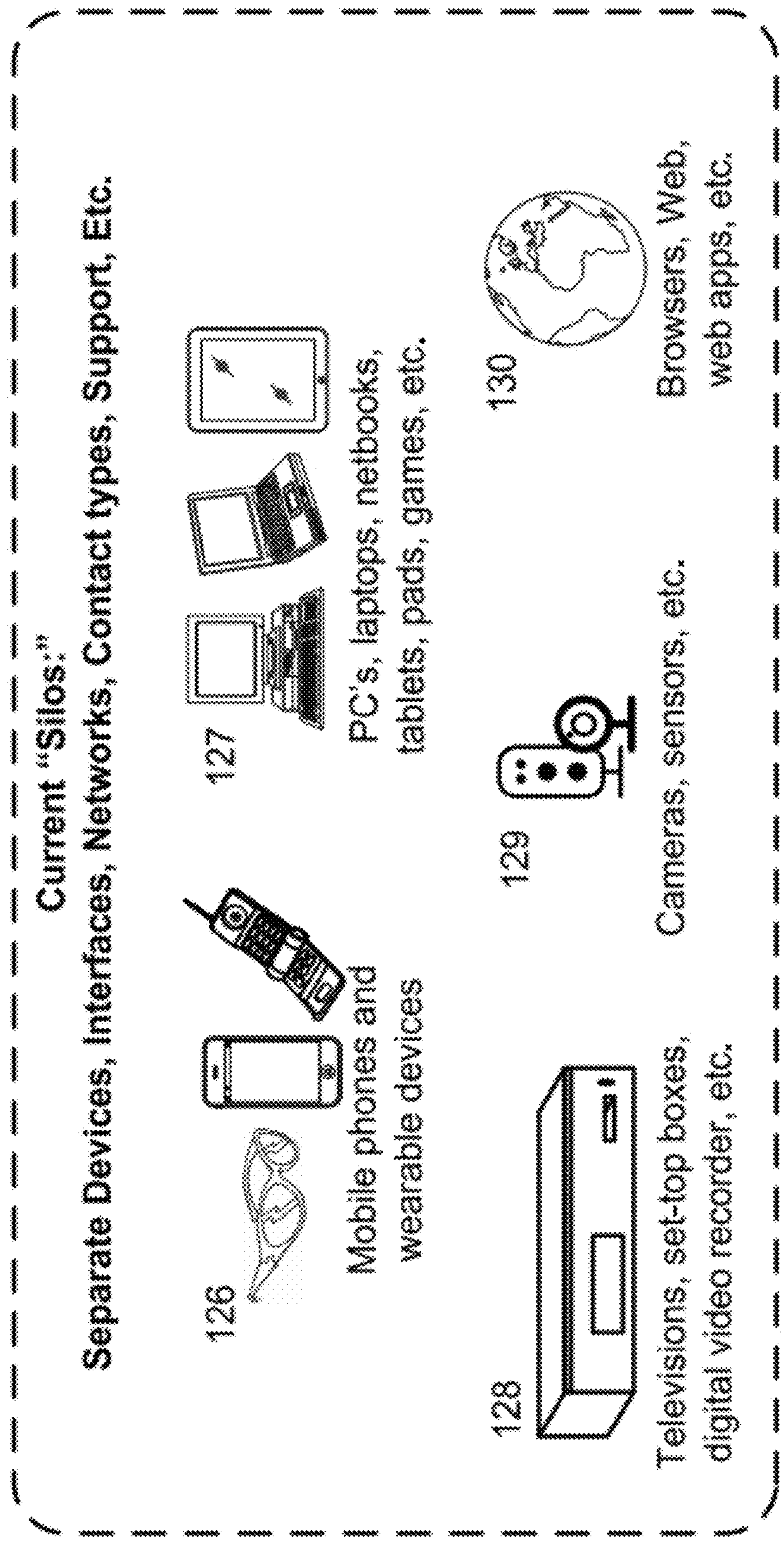
FIG. 7 is a pictorial diagram that illustrates current networked electronic devices, in some examples described in the ARTPM as "subsidiary devices" (prior art).

CURRENT DEVICES—PRIOR ART TO THIS ALTERNATE REALITY: Before describing the ARTPM's Teleportal Devices, FIG. 7 illustrates the current reality's numerous different digital devices that have separate operating systems, interfaces and networks; different means of use for communications and other tasks; different content types that sometimes overlap with each other (with different interfaces and means for accessing the same content); etc.

Essential underlying issues among the current reality's digital devices have parallels to the history of the book. Between about 1435 and 1444 Johann Gutenberg devoted himself to a range of inventions that related to the process of printing with movable type, and he opened the first printing establishment in 1455. In 1457 the first printed book with a printer's imprint was published (the famous Mainz Psalter). Printing spread by training apprentices and others who learned the trade, then went on to move to new cities and open their own printing shops. By 1489 there were 110 printing shops across Europe and by 1500 more than 200. At that time only about 200,000 Europeans could read so books were not the main part of a printer's business, which included posters, broadsheets, pamphlets, and varied shorter works than full books.

Early books were not standardized and took many different layouts and forms, many of them expensive to produce and buy. Most early books simply attempted to imitate the appearance of hand lettered manuscripts and many printers would cut a new typeface to imitate a manuscript when it was copied, even if the letter forms were fairly illegible. Basic elements of "the book" had to be developed and then adopted as standards. An example is a title page that listed a definite title for the book, the author's name, and the printer's name and address. Even simple devices like page numbers, reasonable margins, and a contents page that refers to page numbers rather than sections of the text were both innovations and gradually emerging standards. The content of that century's books were often based on verbal discourse and storytelling—the culture of most people (even those who could read) was oral or semi-oral—so at the level of the text printers were required to regularize spelling, standardize punctuation, separate long blocks of text into paragraphs, etc. Gradually innovations were also made in making text more accessible and readable such as by breaking up the text into units so it was easier to read and return to a section or passage. Together, these innovations and emerging standards made books easier and faster to read which expanded the ways that books could be used, as well as helping spread literacy to more people.

It took about 80 years—until about 1530—before these innovations became widely enough adopted that it could be said that the "book" was developed and standardized. Today, a "traditional" book has many of the elements that took most of the book's first century. This initial century yielded the following "typical book": A book begins with a jacket with endpapers glued to it and the body of the bound book glued to the endpapers (though with a paperback the jacket and endpapers are the same wrap-around cover, with the bound book glued to it). The bound content normally follows a predictable sequence, with the right (or recto) side considered dominant and the left (or verso) side subordinate. The front matter (traditionally called "preliminaries") includes one or more blank pages, a series or "bastard" title on a new right page, a frontispiece on the left, the title page on the right, on the left behind the title page, dedication on the right, a Foreword that begins on the right, a Preface that begins on the right, Acknowledgments that begin on the right, Contents that begin on the right, an Illustrations List that begins on the right or the left, an Introduction that begins on the right. The body of a traditional book's text is equally structured and begins with a part title on the right (if the book is divided into major parts or sections), the opening of each chapter begins in the middle of a right page with the chapter title or chapter number above it (chapter numbers were traditionally Roman Numerals if a small number of chapters, or Arabic numerals if a larger number of chapters), and if illustrated a book may include a separate section for illustrations or plates (which began on a right page). The traditional book's "back matter" includes an Appendix that begins on the right, Notes that begins on the right, a Bibliography that begins on the right, Illustration Credits that begins on the right, a Glossary that begins on the right, an Index that begins on the right, a Colophon that begins on the right or the left, and one or more blank pages.

It was worth spending most of a century developing this "standardized" or "typical" book. This traditional book form communicates more than importance and distinction. It is visible proof that every word of a book is written, edited, designed and printed with care, credibility, authority and taste. For all who are literate the book's layout and design are predictable, easy-to-use, easy to store and care for, and easy to return to any needed parts or passages whenever wanted. These innovations and advances are part of why books are widely credited with playing key roles in the development of the Renaissance, Science, the Reformation, Navigation, Europe's exploration of the world, and much more. During the 1500's more than 200,000 book titles have been recorded, and with an estimated 1,000 copies per title, that is more than 200 million books printed. During the first half of the 1600's that number is estimated to have tripled—so the spread of this new standard book "device" was increasingly part of Europe's wider economic, scientific and cultural progress.

Today, the emergence of our digital environment, with numerous overlapping devices, has parallels to the first century of the book. As depicted in FIG. 7, today's digital era is young and our many digital devices 125 are non-standard, not predictable to use, and do not have a common interface structure that can be employed easily for their range of features, and returned to easily after a period of non-use with easy pick-up where one left off. Yet today's digital devices 126 127 128 129 130 increasingly provide access to similar or overlapping digital media and content, and they also do many of the same things with digital content and interactions—they find, open, display, use, edit, save, look up, contact, attach, transmit, distribute, etc. FIG. 7 lists some examples of these "current devices" 125 which includes: Mobile phones 126, landline telephones 126, VOIP phone lines 126, wearable computing devices 126, cameras built into mobile devices 126 127, PCs 127, laptops 127, stationary internet appliances 127, netbooks 127, tablets 127, e-pads 127, mobile internet appliances 127, online game systems 127, internet-enabled televisions 128, television set-top boxes 128, DVR's (digital video recorders) 128, digital cameras 129, surveillance cameras 129, sensors 144 (of many types; in some examples biometric sensors, in some examples personal health monitors, in some examples presence detectors, etc.), web applications 130, websites 130, web services 130, web content 130, etc.

Therefore, there was a recognition of today's parallels to the first century of the book in the "history" of the Alternate Reality. They factored the parallel functionality and content of the many siloed digital devices 125 and the Alternate Reality evolved a digital devices environment (the ARTPM) that is summarized in FIG. 8. To facilitate this transition the Alternate Reality included the (optional) capability to use a plurality of current devices 125 as Subsidiary Devices to the TPM 140 in FIG. 8, essentially turning them into commodity input/output devices within the TPM's digital environment—but with a common and predictable TP interface that could be used widely and consistently to establish access and remote control, essentially raising the productivity of using a plurality of existing digital devices.

Figure 8:
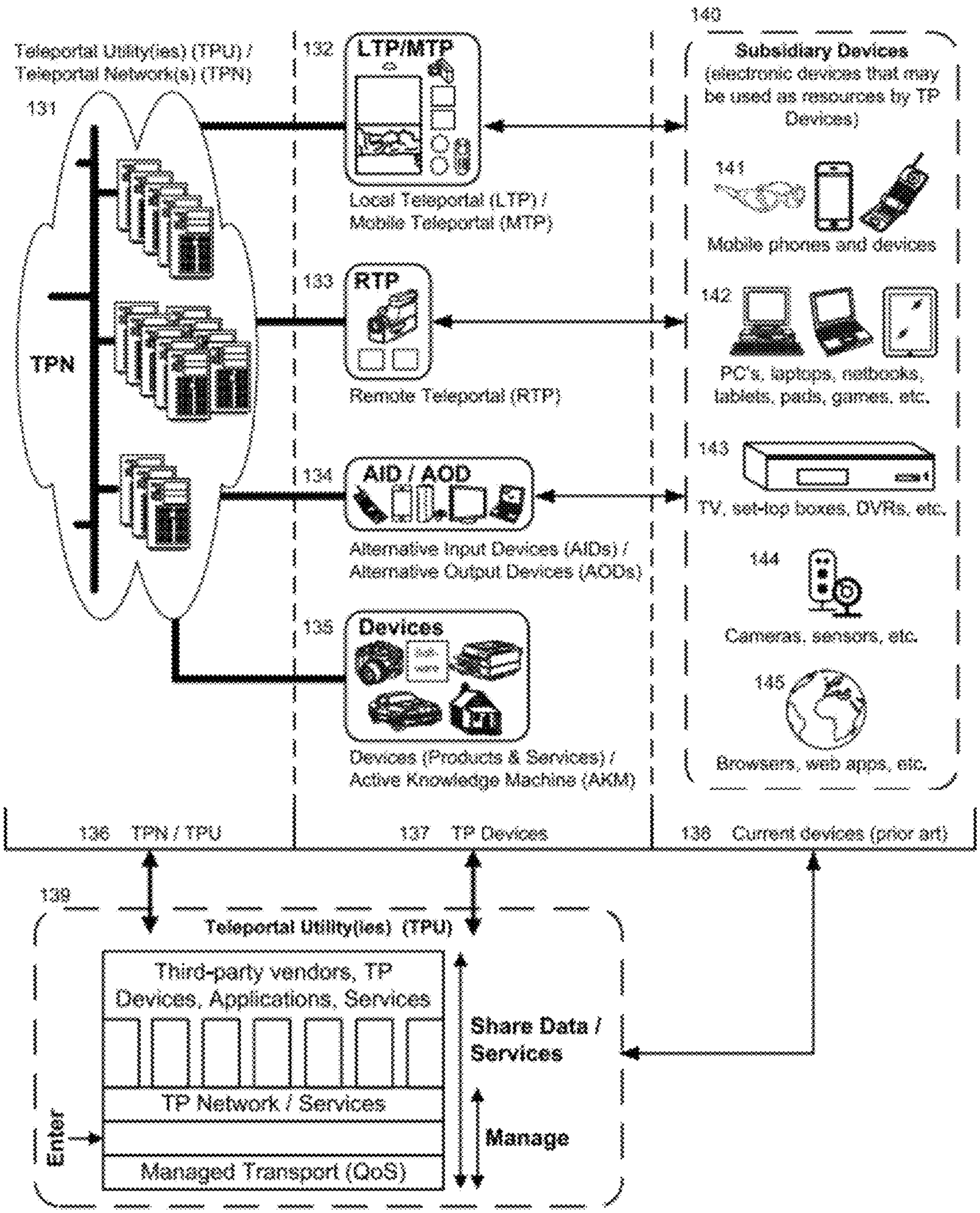
FIG. 8 is a pictorial diagram that illustrates ARTPM devices and the Teleportal Utility (TPU).

TPM DEVICES SUMMARY: After years of building and using the Internet and other networks (such as private, corporate, government, mobile phone, cable TV, satellite, service-provider, etc.), the capabilities for presence to solve both individual and/or collective problems are still in their infancy. This TPM transforms the local glass window to provide means for a substantial leap to Shared Planetary Life Spaces that could be provided over various networks. FIG. 8 provides a high-level illustration of the Teleportal Machine's (TPM's) devices and networks described in FIG. 3, namely Teleportal Devices 52 57, Teleportal Utility 64 and Teleportal Network 64. Turning to FIG. 8 this Teleportal Machine provides a combination of improvements that include multiple components and devices. Taken together, these provide families of devices 132 133 134 135, networks 131, servers 131, systems 131 139, infrastructure utility services 131 139, connections to alternative input/output devices 134, devices that include a plurality of types of products and services 135, and utility infrastructure 139—together comprising a Teleportal Machine (TPM) for looking and listening at a new scale and speed that are explicitly designed to provide the potential to transform human presence, communications, productivity, understanding and a plurality of means for delivering human success.

Local Teleportal (LTP) 132: In some examples ("Local Teleportal" or LTP) this provides the means to transform the local glass window so that instead of merely looking through a wall at the place immediately outside, this "window" 132 becomes able to "be present" in Shared Planetary Life Spaces (which include people, places, tools, resources, etc.) around the planet. Optionally, this "window's" remote presence may behave as if it were a local window because (1) the viewpoint displayed changes automatically to reflect the viewer's position relative to the remote scene (without needing to send commands to the Remote Teleportal's camera(s) by means of a Superior Viewer Sensor (SVS) and related processing in a Local Processing Module), and (2) audio sounds from the remote location may be heard "through" this "window" as if the viewer was present at the remote location and was viewing it through a local window. In addition, alternate video and audio input and output devices may optionally be used with or separately from a Local Teleportal. An In some examples this includes a video camera/microphone 132, along with processing in the LTP's Processing Module 132 and transmission via the LTP's Communications Module 132 to use Teleportal Shared Space(s), and/or to provide personal narration or other local video to make Teleportal broadcasts or augment Teleportal applications. Optionally, alternative access to LTP video and audio, or direct Remote Control or a Virtual Teleportal, may be provided by other means in some examples a mobile phone with a graphical screen 134, a television connected to a cable or satellite network 134, a laptop or PC connected to the Internet or other network 134, and/or other means as described herein.

Mobile Teleportal (MTP) 132: In some examples ("Mobile Teleportal" or MTP) this provides the means to transform a local digital tablet or pad so that instead of merely looking at a display screen this "device" 132 becomes able to "be present" in Shared Planetary Life Spaces (which include people, places, tools, resources, etc.) around the planet. Optionally, this "device's" remote presence may behave as if it were a local window because (1) the viewpoint displayed may be set to change automatically to reflect the viewer's position relative to the remote scene (without needing to send commands to the Remote Teleportal's camera(s) by means of a Superior Viewer Sensor (SVS) and related processing in the MTP's Processing Module), and (2) audio sounds from the remote location may be heard "through" this device as if the viewer was present at the remote location and was viewing it through a local window. In addition, alternate video and audio input and output devices may optionally be used with or separately from a Mobile Teleportal. In some examples this includes a video camera/microphone 132, along with processing in the MTP's Processing Module 132 and transmission via the MTP's Communications Module 132 to use Teleportal Shared Space(s), and/or to provide personal narration or other local video to make Teleportal broadcasts or augment Teleportal applications. Optionally, alternative access to MTP video and audio, or direct Remote Control or a Virtual Teleportal, may be provided by other means in some examples a mobile phone with a graphical screen 134, a television connected to a cable or satellite network 134, a laptop or PC connected to the Internet or other network 134, and/or other means as described herein.

Remote Teleportal (RTP) 133: A "Remote Teleportal" (or RTP) provides one means for inputting a plurality of video and audio sources 133 to Shared Planetary Life Spaces by means of RTPs that are fixed or mobile; stationery or portable; wired or wireless; programmed or remotely controlled; and powered by the electric grid, batteries or other power sources. In addition, optional processing and storage by an RTP Processing Module 133 may be used with or separately from a Remote Teleportal (in some examples for running video applications, for storing video and audio; for dynamic video alterations of the content of a real-time or near-real-time video stream, etc.), along with transmission of real-time and/or stored video and audio by an RTP's Communications Module 133. Optionally, alternative remote input to or output from this Teleportal Utility 131 139 may be provided by other means in some examples an AID/AOD 134 (in some examples an Alternative Input/Output Device such as a mobile phone with a video camera 134) or other means.

Alternate Input Devices (AIDs) 134/Alternate Output Devices (AODs) 134: In some examples these include devices that may be utilized to provide inputs and/or outputs to/from the TPM, such as mobile phones, computing devices, communications devices, tablets, pads, communications-enabled televisions, TV set-top boxes, communications-enabled DVRs, electronic games, etc. including both stationary and portable devices. While these are not a Teleportal they may run a Virtual Teleportal (VTP) or a web browser that emulates a LTP and/or a MTP. Depending on the device's capabilities and connectivity, they may also be able to use the VTP or browser emulation to operate the device as if it were an LTP, a MTP or an RTP—including some or many of a TP Device's functions and features.

Devices 135: In some examples the TPM includes an Active Knowledge Machine (AKM) which transforms a plurality of types of products, equipment, services, applications, information, entertainment, etc. into "AKM Devices" (hereinafter "Devices") that may be served by one or more AKMs (Active Knowledge Machines). In some examples Devices and/or users make an AK request from the AKM by means of trigger events in the use of devices, or by a user making a request. The request is received, parsed, the appropriate Active Knowledge Instructions (AKI) and/or Active Knowledge and/or marketing or advertising is determined, then retrieved from Active Knowledge Resources (AKR). The AKM determines the receiving device, formats the AKI and AK content for that device, then sends it to said receiving device. The AKM determines the result by receiving an (optional) response; if not successful the AKM may repeat the process or the result received may indicate success; in either case, it logs the event in AK results (raw data). Through optimizations the AKM may utilize said AK results to improve the AKR, AKI and AK content, AK message format, etc. The AKI and AK delivered may include additional content such as advertisements, links to additional AK (such as "best choice" for that type of device, reports or dashboards on a user's or group's performance), etc. Reporting is by means of standard or custom dashboards, standard or custom reports, etc., and said reporting may be provided to individual users, sponsors (such as advertisers), device vendors, AKM systems that employ AK results data, other external applications that employ AK results data, etc.

Teleportal Network (TPN) 131: In some examples a "Teleportal Network" (or TPN) provides communications means to connect Teleportal Devices in some examples LTPs 132, MTPs 132, RTPs 133, AIDs/AODs 134 by means of various devices and systems that are in a separate patent application. The transport network may include in some examples the public Internet 131, a private corporate WAN 131, a private network or service for subscribers only 131, or other types of communications. In addition, optional network devices and utility systems 131 may be used with or separately from a Teleportal Network, in some examples to provide secure communications by means such as authentication, authorization and encryption, dynamic video editing such as for altering the content of real-time or stored video streams, or commercial services by means such as subscription, membership, billing, payment, search, advertising, etc.

Teleportal Utility (TPU) 131 139: In some examples a "Teleportal Utility" (or "TPU") provides the combination of both new and existing devices and systems that, taken together, provide a new type of utility that integrates new and existing devices, systems, methods, processes, etc. to look, listen and communicate bi-directionally both in real-time Shared Planetary Life Spaces that include live and recorded video and audio, and in some examples including places, tools, resources, etc. This TPU 131 139 is related to the integration of multiple devices, networks, systems, sensors and services that are described in some other examples herein together with this TPU. This TPU provides means for (1) in some examples viewing of, and/or listening to, one or a plurality of remote locations in real-time and/or recordings from them, (2) in some examples remote viewing and streaming (and/or recording) of video and audio from one or a plurality of remote locations, (3) in some examples network servers and services that enable a local viewer(s) to watch one or a plurality of remote locations both in real-time and recorded, (4) in some examples configurations that enable visible two-way Shared Space(s) between two or multiple Local Teleportals, (5) in some examples construction of non-edited or edited video and audio streams from multiple sources for broadcast or re-broadcast, (6) in some examples providing interactive remote use of applications, tools and/or resources running locally and/or running remotely and provided locally for interactive use(s), (7) in some examples (optional) sensors that determine viewer(s) positions and movement relative to the scene displayed, and respond by shifting the local display of a remote scene appropriately, along with other features and capabilities as described herein, (8) etc. The transport network may include in some examples the public Internet 131, a private corporate WAN 131, a private network or service for subscribers only 131, or other types of communications or networks. In addition, optional network devices 131 and utility systems 139 may be used with or separately from a Teleportal Network 131, in some examples to provide secure communications by means such as authentication, authorization and encryption; dynamic video editing such as altering the content of real-time or stored video streams; commercial services by means such as subscription, membership, billing, payment, search, advertising; etc.

Additions to existing Devices, Services, Systems, Networks, etc.: In addition, vendors of mobile phones 141, landline telephones 141, VOIP phone lines 141, wearable computing devices 141, cameras built into mobile devices 141 142, PCs 142, laptops 142, stationary internet appliances 142, netbooks 142, tablets 142, pads 142, mobile internet appliances 142, online game systems 142, internet-enabled televisions 143, television set-top boxes 143, DVR's (digital video recorders) 143, digital cameras 144, surveillance cameras 144, sensors 144 (of many types; in some examples biometric sensors, in some examples personal health monitors, in some examples presence detectors, etc.), web applications 145, websites 145, web services 145, etc. may utilize Teleportal technology to add Teleportal features and capabilities to their mobile phones 141, landline telephones 141, VOIP phone lines 141, wearable computing devices 141, cameras built into mobile devices 141 142, PCs 142, laptops 142, netbooks 142, tablets 142, pads 142, online game systems 142, television set-top boxes 143, DVR's (digital video recorders) 143, cameras 144, surveillance cameras 144, sensors 144, web applications 145, websites 145—whether as part of their basic subscription plan(s), or for an additional charge by adding it as another premium, separately priced upgrade, feature or service.

Subsidiary Devices 140: By means of Virtual Teleportals (VTP) 60 in FIG. 3 and Remote Control Teleportaling (RCTP) 60, some examples of various current devices depicted in FIG. 7 may be utilized as (commodity) Subsidiary Devices 140 in FIG. 8. In some examples this integration constitutes innovations in their functionality, ease of use, integration of multiple separate devices into one ARTPM system, etc. In some examples this provides only limited functionality and services that Teleportaling provides. In some examples:

Use Remote Control Teleportaling (RCTP) to run PC's 142, laptops 142, netbooks 142, tablets 142, pads 142, game systems 142, etc.: In some examples a plurality of PCs may be used by Remote Control from LTPs, MTPs and RTPs, or from AIDs/AODs that are running a RCTP (Remote Control Teleportal). This turns those PC's into commodity-level resources that may be accessed from the various TP Devices. In some examples PC's can be provided throughout a Shared Planetary Life Space to all of its participants from any of its participants who choose to put any of their appropriately configured PC's online for anyone in the SPLS to use. In some examples PC's can be provided openly online for charities and nonprofit organizations to use, so they have the computing they need without needing to buy as many PC's. In some examples PC's can be provided for a specific SPLS group(s) such as students in developing countries, schools in developing countries, etc. In some examples PC's can be provided for specific services such as to add face recognition to a camera that doesn't have sufficient computing or storage, to add "my property" authentication and theft alerts to devices that don't have sufficient computing or storage, etc. In some examples PC's can be rented to provide computers and/or computing for specific purposes. In some examples PCs can be used for specific purposes such as face recognition to spot and track celebrities in public, then send alerts on their locations and activities, so those who follow each celebrity can observe them as they move from location to location. In some examples other devices (such as laptops 142, netbooks 142, tablets 142, pads 142, games 142, etc.) may be capable of being controlled remotely, in which case they may be turned into commodity Subsidiary Devices that are run in various combinations from TP Devices and the TPM. Whether these devices can be controlled remotely depends on the functions and capabilities of each device; and even when this is possible only a subset of RCTP capabilities and/or features may be available.

Use a Virtual Teleportal (VTP) to run Teleportals on PC's 142, laptops 142, netbooks 142, tablets 142, pads 142, games 142, etc.: In some examples functionality may be added to various digital devices by running a Virtual Teleportal, which provides them the functionality of a Teleportal without needing to buy a TP Device 132 133. This turns them into an AID/AOD 134. Whether a VTP can run on each of these devices depends on the functions and capabilities of each device; even when it can run only a subset of VTP capabilities and/or features may be available.

Use an LTP 132, MTP 132, or AID/AOD 134 to replace mobile phone and/or landline phone calling services: In some examples a plurality of phone lines and/or phone services might be replaced by Teleportal Shared Space(s), whether from a fixed location by means of a Local Teleportal 132 or from mobile locations by means of a Mobile Teleportal 132, and/or from fixed or mobile locations by means of an AID/AOD 134. In some examples only basic phone calling services and phone lines may be replaced by TP Devices 132 134. In some examples more phone services and phone lines may be replaced 132 134, such as voice mail, text messaging, photographs, video recording, photo and video distribution, etc.

Use Remote Control Teleportaling (RCTP) to run mobile phones 141, wearable computers 141, cameras built into mobile devices 141 142, etc.: In some examples a plurality of mobile devices may be used by Remote Control from LTPs, MTPs and RTPs, or from AIDs/AODs that are running a RCTP (Remote Control Teleportal). This turns those mobile devices into commodity-level resources that may be accessed from the various TP Devices. Whether a mobile device can be controlled remotely depends on the functions and capabilities of each device; and even when this is possible only a subset of RCTP capabilities and/or features may be available.

Use a Virtual Teleportal (VTP) to run Teleportals (where technically possible) on mobile phones 141, landline telephones 141, VOIP phone lines 141, wearable computing devices 141, cameras built into mobile devices 141 142, PCs 142, laptops 142, netbooks 142, tablets 142, pads 142, online game systems 142, television set-top boxes 143, DVR's (digital video recorders) 143, cameras 144, surveillance cameras 144, sensors 144, web applications 145, websites 145, etc. In some examples functionality may be added to various digital devices by running a Virtual Teleportal, which provides the technically possible subset of functionality of a Teleportal without needing to buy a TP Device 132 133. This turns them into an AID/AOD 134. Whether a VTP can run on each of these devices depends on the functions and capabilities of each device; even when it can run only a subset of VTP capabilities some TP features may be available.

Telephone: Mobile/Landline/VOIP (Voice over IP over the Internet): This includes the mobile phone vendors and landline RBOCs (Regional Bell Operating Companies) such as BellSouth, Qwest, AT&T and Verizon. It also includes VOIP vendors such as Vonage and Comcast (whose Digital Voice product has made this company the fourth largest residential phone service provider in the United States). In some examples TP Devices may replace landlines or mobile phone lines, or VOIP lines for telephone calling services. In some examples any type of compatible device or service can be attached to the phone network and this may include TP Devices 132 133 134 135 140. In some examples various phone services may be provided or substituted by TP Devices 132 133 134 such as texting, telephone directories, voice mail/messaging, etc. (though with TP-specific differences). Even location-based services such as navigation and local search may be replaced on Teleportals (again with TP-specific differences).

Cable television/Satellite television/Broadcast television/IPTV (Internet-based TV over IP)/Videos/Movies/Multimedia shows: Teleportal Devices 132 133 134 135 140 might provide access to television from a variety of sources. In some examples TP Devices 132 133 134 140 may substitute for cable television, satellite television, broadcast television, and/or IPTV. In some examples TP Devices 132 133 134 140 may run local TV set-top boxes and display their television signals locally, or transmit their television signals and display them in one or a plurality of remote locations. In some examples TP Devices 132 133 134 140 may run remote TV set-top boxes and display their television signals locally, or rebroadcast those remotely received television signals and display them in one or a plurality of remote locations. In some examples Teleportals 132 134 140 may be used to be present at events located in any location where TP Presence may be established. In some examples Teleportals 132 134 140 may be used to view television shows, videos and/or other multimedia that is available on demand and/or broadcast over a network. In some examples Teleportals 132 134 140 may be used to be present at events located in any location where TP Presence may be established, those events may be recorded and re-broadcast either live or by broadcasting said recording at a later date(s) and/or time(s). In some examples Teleportals 132 133 134 140 may be used to acquire and copy television shows, videos and/or other multimedia for rebroadcast over a private Teleportal Broadcast Network.

Substitute for Subsidiary Devices via Remote Control Teleportaling (RCTP): By means of RCTP it may be possible to substitute TP Devices 132 133 134 140 (including Subsidiary Devices) for a range of other electronics devices so that not everyone needs to own and run as many of these as today. Some of the electronic devices that may be substituted for by means of TP Devices may include mobile phones 141, landline telephones 141, VOIP phone lines 141, wearable computing devices 141, cameras built into mobile devices 141 142, PCs 142, laptops 142, netbooks 142, tablets 142, pads 142, online game systems 142, television set-top boxes 143, DVR's (digital video recorders) 143, cameras 144, surveillance cameras 144, sensors 144, web applications 145, websites 145, etc. Whether RCTP can run on each of these devices depends on the functions and capabilities of each device; even when it can run only a subset of RCTP capabilities some TP features may be available.

Services, applications and systems: Some widely used online services might be provided by Teleportal Devices 132 133 134 140. In some examples PC-based and mobile phone-based services like Web browsing and Web-based email, social networks, online games, accessing live events, news (which may include news of various types and formats such as general, business, sports, technology, etc. news, in formats such as text, video, interviews, "tweets," live observation, recorded observations, etc.), online education, reading, visiting entertainments, alerts, location-based services, location-aware services, etc. These and other services, applications and systems may be accessed Teleportal Devices 132 133 134 140 by means such as an application(s), a Web browser that runs on physical Teleportals, runs on other devices by means of a VTP (Virtual Teleportal), runs on other devices by means of RCTP (Remote Control Teleportaling), etc. Whether a VTP or an RCTP can run on each of these devices and provide each type of substitution depends on the functions and capabilities of each device; even when it can run only a subset of RCTP capabilities some TP features may be available.

New innovations that may be accessed as Subsidiary Devices: Entirely new classes of electronics devices 140, services 140, systems 140, machines 140, etc. might be accessed by means of Teleportal Devices 132 133 134 135 140 if said electronics can run a VTP (Virtual Teleportal) or be controlled by means of an RCTP (Remote Control Teleportaling). Whether VTP and/or RCTP can run on each of these devices depends on the functions and capabilities of each device; even when it can run only a subset of VTP and/or RCTP capabilities some TP features may be available.

Unlike the huge variety of complicated user interfaces on many types of devices 125 126 127 128 129 130 in FIG. 7 that make it difficult for users to fully employ some types, models or new versions of devices, applications and systems—and too often prevent them from using a plurality of advanced features of said diverse devices, applications and systems; said Teleportal Machine, summarized in FIG. 8, provides an Adaptable Common User Interface 51 in FIG. 3 across its set of TP Devices (LTP 132, MTP 132, RTP 133, AID/AOD 134, and AKM Devices 135) and TP Utility 139 functions that include Teleportal Shared Space(s) 55 56 in FIG. 3, Virtual Teleportals 60 61, Remote Control Teleportals 60 61, Teleportal Broadcast Networks 53 54, Teleportal Applications Networks 53 54, Other Teleportal Networks 58 59, Entertainment and RealWorld Entertainment 62 63. Because said Teleportal's "fourth screens" can add a usable interface 212 across a wide range of interactions 52 53 55 57 58 60 62 that today require customers to figure out difficulties in interfaces on the many types and models of products, services, applications, etc. that run on today's "three screens" of PC's, mobile phones and navigable TVs on cable and satellite networks 125 126 127 128 129 130 in FIG. 7, said Teleportal Utility's Common User Interface 51 could make it easier for customers to use said one shared Teleportal interface to succeed in doing a plurality of tasks, and accomplish a plurality of goals that might not be possible when required to try to figure out a myriad of different interfaces on the comparable blizzard of technology-based products, services, applications and systems.

Figure 9:
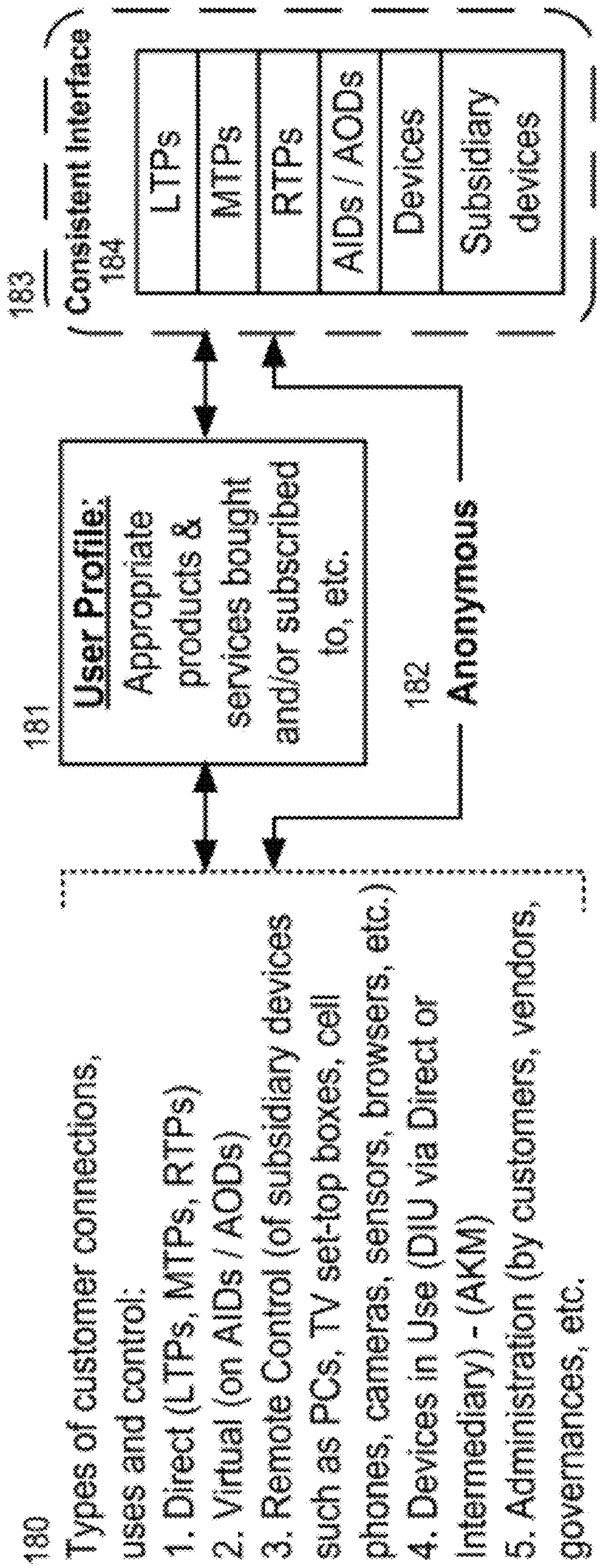
FIG. 9 is a schematic diagram that illustrates a high-level views of some connections and interactions, including a consistent adaptive user interface across many ARTPM devices.

SUMMARY OF TPM CONNECTIONS AND INTERACTIONS: FIG. 9, "Stack View of Connections and Interface," illustrates the manageability and consistency of the TP Devices environment illustrated and discussed in FIG. 8. A pictorial illustration of this FIG. 9 view will be discussed in FIG. 10, "Summary of TPM Connections and Interactions." The Teleportal Utility's (TPU's) Adaptable Consistent Interface and user experience is illustrated and discussed in FIGS. 183 through 187 and elsewhere. To begin, the stack view in FIG. 9 summarizes the types of connections and interfaces in the TPM Devices Environment 136 137 138 139 in FIG. 8. From this view there are five main types of connections 180 and just one TPU Interface 183 across these five types of connections. With FIG. 8's focused view of five connection types and one TPU Interface it can be seen that all parts of the ARTPM, including Subsidiary Devices, can be run in a manageable way by almost any user throughout the ARTPM digital environment. This architecture of five main types of connections 180 and one TPU Interface 183 is consciously designed as a radical Alternate Reality simplification of our current reality where a blizzard of devices and interfaces are comparatively complex and difficult to use—in fact, our current reality requires an entire set of professions and functions (variously known as usability, ergonomics, formative evaluation, interface design, parts of documentation, parts of customer support, etc.) to deal with the resulting complexities and user difficulties.

This Alternate Reality TPM stack view includes: (1) Direct Teleportal Use 180 employs the consistent TPU Interface 183 across LTPs (Local Teleportals) 132 180 184, MTPs (Mobile Teleportals) 132 180 184, and RTPs (Remote Teleportals) 133 180 184; (2) Virtual Teleportal (VTP) use 180 184 employs an adaptable subset of the consistent TPU Interface 183 and is used on AIDs/AODs (Alternate Input Devices/Alternate Output Devices) 134 180 184 as described elsewhere (it is worth noting that whether a VTP can run on each of these AID/AOD devices depends on the functions and capabilities of each AID/AOD device; and when it can run only an adapted subset of VTP capabilities only some TP features may be available—and those features would employ a subset of the Consistent TPU Interface 183); (3) Remote Control Teleportaling (RCTP) use 180 employs an adaptable subset of the consistent TPU Interface 183 and is used on Subsidiary Devices 140 180 184 as described elsewhere (it is worth noting that whether an RCTP can run on each of these Subsidiary Devices depends on the functions and capabilities of each Subsidiary Device; and when it can run only an adapted subset of RCTP capabilities only some TP features may be available—and those features would employ a subset of the Consistent TPU Interface 183); (4) Devices In Use (DIU) 180 employs an AKM (Active Knowledge Machine) subset of the consistent TPU Interface 183 and is used on DIU's 135 180 184 or on Intermediary Devices 135 180 184 as described elsewhere (such as in the AKM starting in FIG. 193 and elsewhere; it is worth noting that the AKM subset of the adaptable TPU Interface 183 varies considerably by the functions and capabilities of each Device In Use and/or its Intermediary Device; and when it can run only an adapted subset of RCTP capabilities only some TP features may be available—and those features would employ a subset of the Consistent TPU Interface 183); (5) Administration 180 of one's User Profile 181, account(s), subscription(s), membership(s), settings, etc. (such as of the TPU 131 136 139 180; TPN 131 136 139 180; etc.) employs the consistent TPU Interface 183 when said Administration 180 is done by means of a TP Device such as LTPs (Local Teleportals) 132 180 184, MTPs (Mobile Teleportals) 132 180 184, and RTPs (Remote Teleportals) 133 180 184; it employs an adaptable subset of the consistent TPU Interface 183 when Administration 180 is done by means of a VTP on an AID/AOD (Alternate Input Device/Alternate Output Device) 134 180 184.

The TPU's Adaptable Consistent Interface 183 is an intriguing possibility. Improved designs have replaced the leaders of entire industries such as when Microsoft locked down market control of the PC operating system and Office software industries by introducing Windows and Microsoft Office. For another example; Apple became a leader of the music, smart phone and related electronic tablet industries with its iPod/iPhone/iPad/iTunes product lines. These types of transformations are rare but possible, especially when a major company drives it. In a possible parallel business evolution, the advent of the Teleportal Utility's (TPU's) Adaptable Consistent Interface 183 9218 in FIG. 183 "User Experience" might provide one or more major companies with the business opportunity to attempt replacing current industry leaders in multiple business categories. They would offer users a new choice between today's blizzard of different and (in combination) hard to learn and confusing interfaces, or users could choose one TPU Adaptable Consistent Interface 183 9218 across a digital environment. Another competitive advantage is the current anti-customer business model of leading vendors who have saturated their markets (like Microsoft) and are unable to fill their annual coffers if they can't compel their customers to buy upgrades to products they already own—so in our current reality customers are required to buy treadmill versions of products they already own, with versions that often make their users feel more like rats on a wheel than the more advanced, more productive champions of the future depicted in their vendors' marketing. As a comparison, the Teleportal Utility's (TPU's) Adaptable Consistent Interface 183 is kept updated to fit a plurality of users' preferences and devices, as described elsewhere.

In summary, with one TPU Adaptable Consistent Interface 183 and a set of main types of connections 180, users are able to learn and productively utilize the TP Devices environment 131 132 133 134 140 136 137 138 139, including Virtual Teleportals 134 140 on AIDs/AODs, and with Remote Control of Subsidiary Devices 140. With this type of Alternate Reality TPM departure possible, is it any wonder why the "Alternate Reality" chose this simpler path, and chose to invent around the bewildering user interfaces problems of our current reality?

Figure 10:
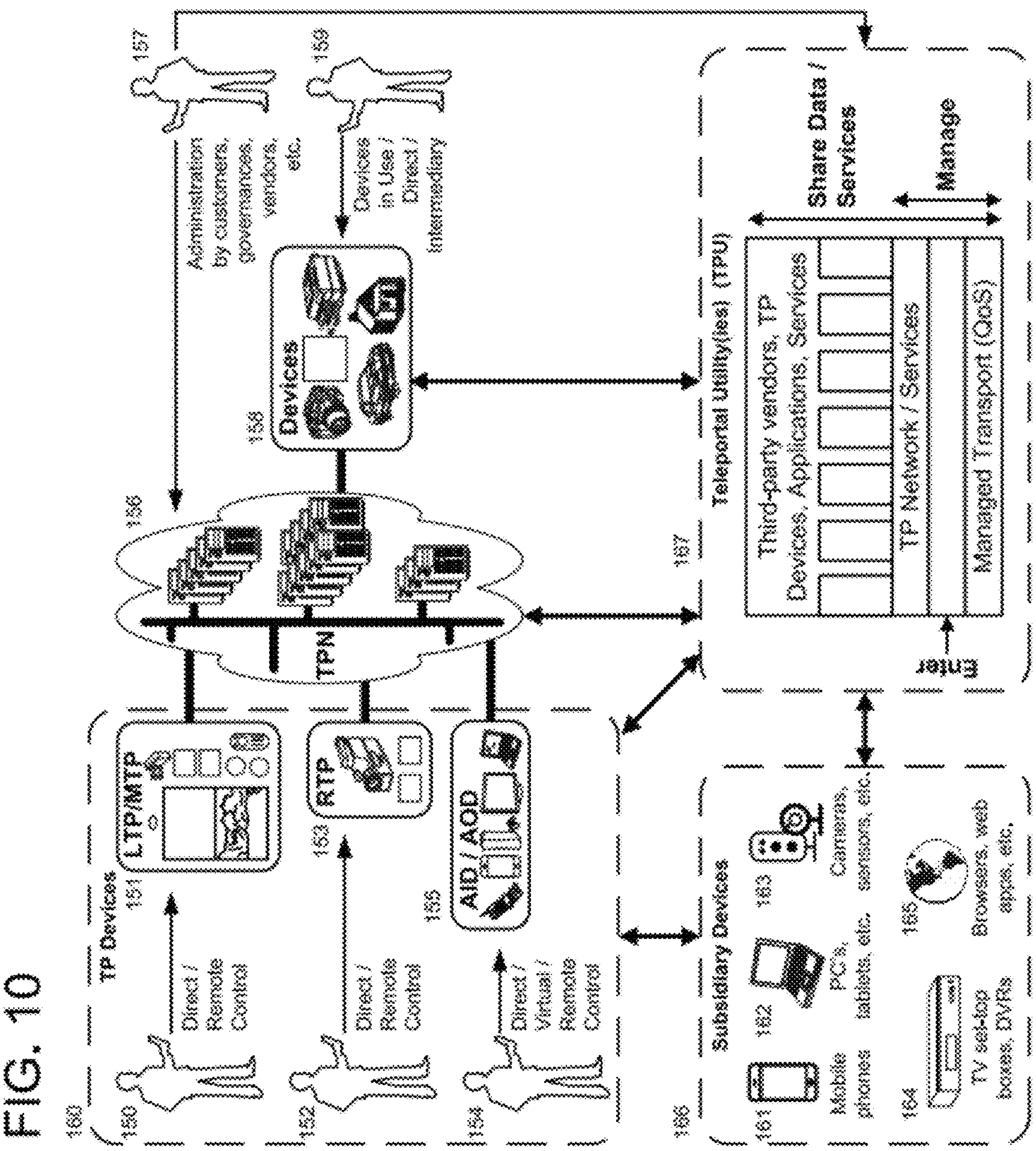
FIG. 10 is a pictorial diagram that illustrates some examples of controlling main TP devices and how they connect and interact.

SUMMARY OF ARTPM CONNECTIONS AND INTERACTIONS: Some pictorial examples are illustrated in FIG. 10, "Summary of TPM Connections and Interactions." These reverse the Stack View in FIG. 9 by showing the TP Devices depicted in FIG. 8, but listing each device's types of connections and interactions. In brief, this example demonstrates how a Consistent TPU Interface 183 (and FIGS. 183 through 187 and elsewhere) is displayed to users 150 152 154 157 159 across the TP Devices environment 160 151 153 155 156 158 166 161 162 163 164 165 167. In some examples users may enter the TP Devices environment by using an (1) LTP 151 or an MTP 151, (2) a RTP 153, (3) an AID/AOD 155, (4) Devices In Use 158, or for (5) Administration 157.

In each of these cases: (1) When a user 150 makes direct use of a Local Teleportal (LTP) 151 or a Mobile Teleportal 151 the user employs the Consistent TPU Interface 183; when said user 150 employs the LTP 151 or MTP 151 to control a Subsidiary Device 166 161 162 163 164 165 the user employs Remote Control Teleportaling (RCTP) 180 which is an adaptable subset of the consistent TPU Interface 183 (it is worth noting that whether an RCTP can run on each of these Subsidiary Devices depends on the functions and capabilities of each Subsidiary Device; and when it can run only an adapted subset of RCTP capabilities only some TP features may be available—and those features would employ a subset of the Consistent TPU Interface 183); (2) When a user 152 makes direct use of a Remote Teleportal (RTP) 153 the user employs the Consistent TPU Interface 183; when said user 152 employs the RTP 153 to control a Subsidiary Device 166 161 162 163 164 165 the user employs Remote Control Teleportaling (RCTP) 180 which is an adaptable subset of the consistent TPU Interface 183 (it is worth noting that whether an RCTP can run on each of these Subsidiary Devices depends on the functions and capabilities of each Subsidiary Device; and when it can run only an adapted subset of RCTP capabilities only some TP features may be available—and those features would employ a subset of the Consistent TPU Interface 183); (3) When a user 154 makes direct use of an Alternate Input Device/Alternate Output Device (AID/AOD) 155 because it may have a plurality of Teleportaling features built into it the user may employ the Consistent TPU Interface 183 for those direct Teleportaling features if that device's vendor also adopts the Consistent TPU Interface 183 for those Teleportaling features; when said user 154 employs an AID/AOD 155 by means of a Virtual Teleportal (VTP) 180 that VTP is an adaptable subset of the consistent TPU Interface 183 as described elsewhere (it is worth noting that whether a VTP can run on each of these AID/AOD devices depends on the functions and capabilities of each AID/AOD device; and when it can run only an adapted subset of VTP capabilities only some TP features may be available—and those features would employ a subset of the Consistent TPU Interface 183); when said user 154 employs an AID/AOD 155 by means of a Virtual Teleportal (VTP) 180 that may be used to control a Subsidiary Device 166 161 162 163 164 165 by means of Remote Control Teleportaling (RCTP) 180 which is an adaptable subset of the consistent TPU Interface 183 (it is worth noting that whether a combined VTP and RCTP can run on each of these Subsidiary Devices depends on the functions and capabilities of each Subsidiary Device; and when it can run only an adapted subset of VTP and RCTP capabilities only some TP features may be available—and those features would employ a subset of the Consistent TPU Interface 183); (4) When a user 159 makes direct use of TPU's Active Knowledge Instructions (AKI) and/or Active Knowledge (AK) on a Device In Use (DIU) 158 the user may employ the Consistent TPU Interface 183 which contains an adaptable AKM interface for said AKM uses 159 158 if that device's vendor also adopts the Consistent TPU Interface 183 for said device's AKM deliveries and interactions (it is worth noting that whether a DIU can run an AKM interaction and display the AKI/AK depends on the functions and capabilities of each DIU; and when it can run only an adapted subset of AKM capabilities only some AKI/AK may be available—and those features would employ a subset of the AKM portion of the Consistent TPU Interface 183); when a user 159 employs an intermediary device (in some examples an MTP 151, in some examples an AID/AOD 155, etc.) for an Active Knowledge Machine interaction on behalf of a Device In Use 158, the user employs the Consistent TPU Interface 183 which contains an adaptable AKM interface for said AKM uses 159 158; (5) When a user 157 administers said user's 157 profile 181, account(s), subscription(s), membership(s), settings, etc. (such as of the TPU 167 156; TPN 156 167; etc.) the user may employ the Consistent TPU Interface 183 when said Administration 157 is done by means of a TP Device such as LTPs 151, MTPs 151, and RTPs 153; said user 157 employs an adaptable subset of the Consistent TPU Interface 183 when Administration 157 is done by means of a VTP on an AID/AOD 155.

Again, the range of TP Devices 160 151 153 155 158 156 167 166 and types of user connections 150 152 154 157 159 employ one Consistent TPU Interface 183, which is customizable and adaptable by means of subsets to various AID/AOD devices 155, Subsidiary Devices 166, and Devices In Use 158 as described in FIGS. 183 through 187 and elsewhere. This means a user can learn just one interface and then manage and control the ARTPM's range of features and devices, as well as subsidiary devices. This Alternate Reality is designed as a radical simplification of our current reality which requires multiple professions, corporate functions and huge costs (such as parts of customer support, parts of documentation, usability, ergonomics, formative evaluation, etc.) to deal with the numerous user difficulties that result from today's inconsistent designs and complexities.

Logically Grouped List of ARTPM Components: To assist in understanding of the ARTPM (Alternate Reality Teleportal Machine) FIG. 11 through FIG. 16 provide a high-level logically grouped snapshot of some components in a list that is neither detailed nor complete. In addition, this list does not match the order of the specification. It does, however, provide some examples of a logical grouping of the ARTPM's components.

Figure 11:
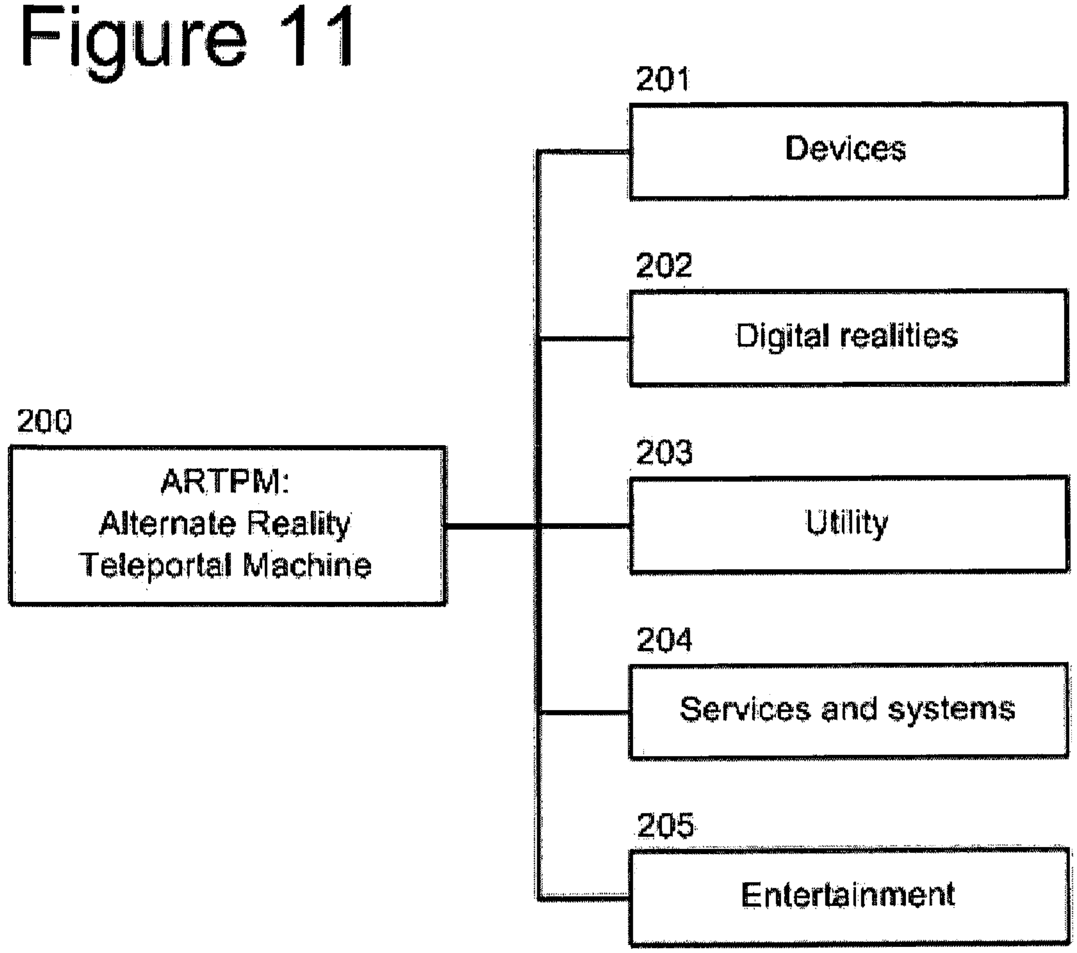
FIG. 11 is a hierarchical chart that illustrates a logical summary grouping of some main components in the ARTPM.

Turning now to FIG. 11, at the level of some main categories, in some examples an ARTPM 200 includes in some examples one or a plurality of devices 201; in some examples one or a plurality of digital realities 202; in some examples one or a plurality of utilities 203; in some examples one or a plurality of services and systems 204; and in some examples one or a plurality of types of entertainment 205.

Figure 12:
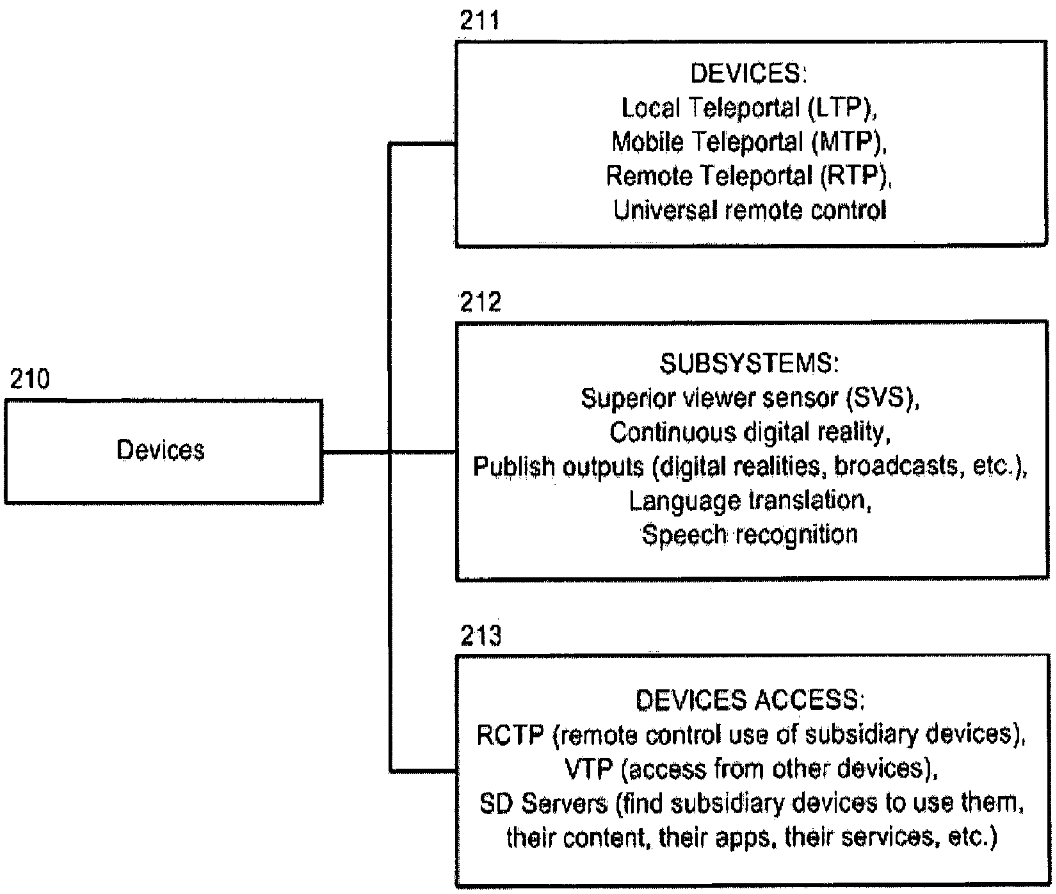
FIG. 12 is a hierarchical chart that illustrates a logical summary grouping of some devices components in the ARTPM.

Turning now to FIG. 12 in some examples ARTPM devices 211 include in some examples one or a plurality of Local Teleportals 211; in some examples one or a plurality of Mobile Teleportals 211; in some examples one or a plurality of Remote Teleportals 211; and in some examples one or a plurality of Universal Remote Controls 211. In some examples ARTPM subsystems 212 include in some examples superior viewer sensors 212; in some examples continuous digital reality 212; in some examples publication of outputs 212 such as in some examples constructed digital realities, in some examples broadcasts, and in some examples other types of outputs; in some examples language translation 212; and in some examples speech recognition 212. In some examples ARTPM devices access 213 includes in some examples RCTP (Remote Control Teleportaling) 213 which in some examples enables Teleportal devices to control and use one or a plurality of some networked electronic devices as subsidiary devices; in some examples VTP (Virtual Teleportal) 213 which in some examples enables other networked electronic devices to access and use Teleportal devices; and in some examples SD Servers (Subsidiary Device Servers) 213 which in some examples enables the finding of subsidiary devices in order in some examples to use the device, in some examples to use digital content that is on the subsidiary device, in some examples to use applications that run on the subsidiary device, in some examples to use services that a particular subsidiary device can access, and in some examples to use a subsidiary device for other uses.

Figure 13:
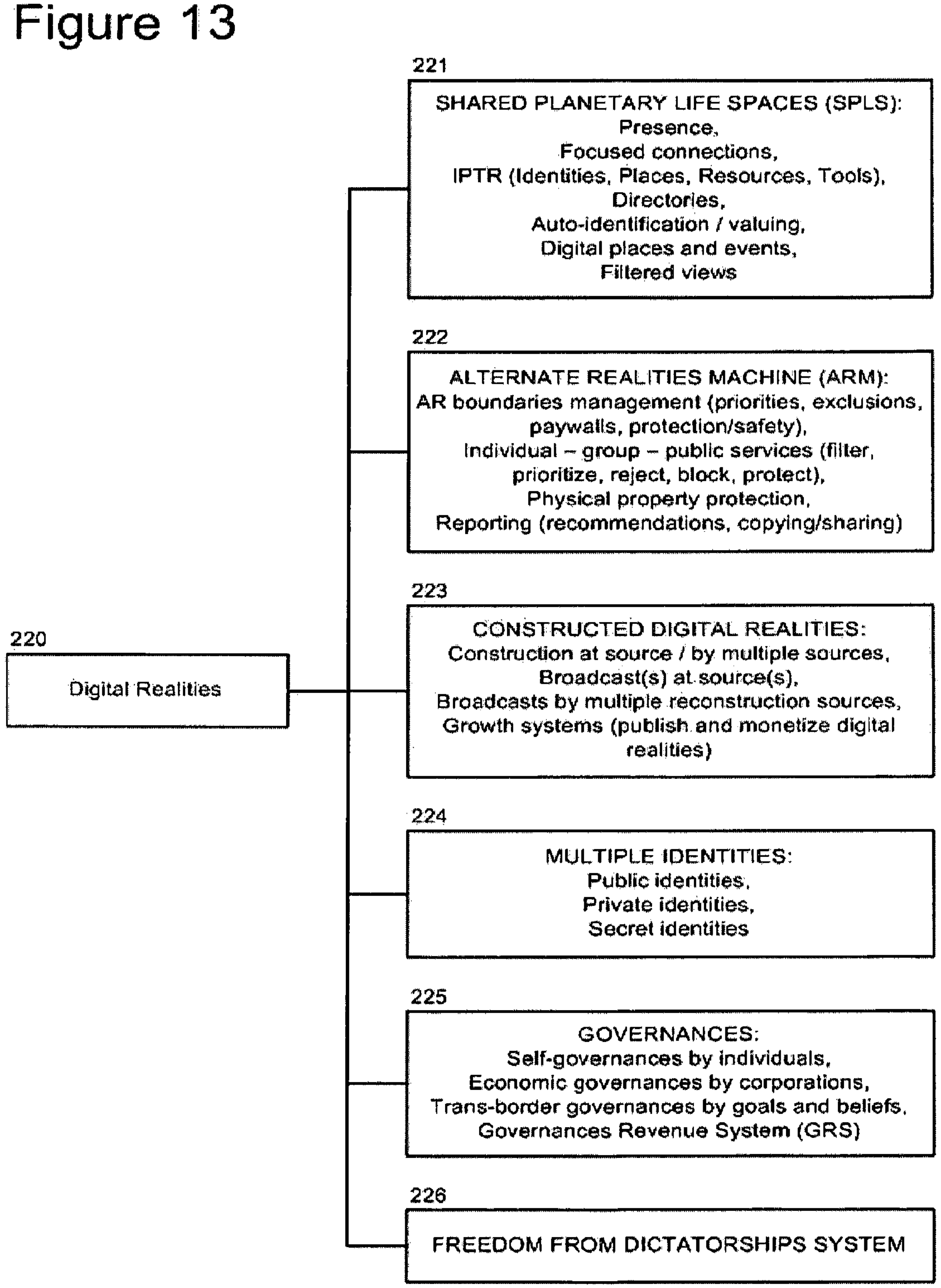
FIG. 13 is a hierarchical chart that illustrates a logical summary grouping of some digital realities components in the ARTPM.

Turning now to FIG. 13 in some examples ARTPM digital realities 220 include at a high level in some examples SPLS (Shared Planetary Life Spaces) 221, in some examples an ARM (Alternate Realities Machine) 222, in some examples Constructed Digital Realities 223: in some examples multiple identities 224; in some examples governances 225; and in some examples a freedom from dictatorships system 226. In some examples ARTPM SPLS (Shared Planetary Life Spaces) 221 include in some examples some types of digital presence 221, in some examples one or a plurality of focused connections 221, in some examples one or a plurality of IPTR (Identities, Places, Resources, Tools) 221, in some examples one or a plurality of directories 221, in some examples auto-identification 221, in some examples auto-valuing 221, in some examples digital places 221, in some examples digital events in digital places 221, in some examples one or a plurality of identities at digital events in digital places 221, and in some examples filtered views 221. In some examples an ARTPM ARM (Alternate Realities Machine) 222 includes in some examples the management of one or a plurality of boundaries 222 (such as in some examples priorities 222, in some examples and exclusions 222, in some examples paywalls 222, in some examples personal protection 222, in some examples safety 222, and in some examples other types of boundaries 222); in some examples ARM boundaries for individuals 222; in some examples ARM boundaries for groups 222; in some examples ARM boundaries for the public 222; in some examples ARM boundaries for individuals, groups and/or the public that include in some examples filtering 222, in some examples prioritizing 222, in some examples rejecting 222, in some examples blocking 222, in some examples protecting 222, and in some examples other types of boundaries 222; in some examples ARM property protection 222; and in some examples reporting of the results of some uses of ARM boundaries 222 with in some examples recommendations for "best boundaries" 222, and in some examples means for copying boundaries 222, and in some examples means for sharing boundaries 222. In some examples ARTPM Constructed Digital Realities 223 include in some examples digital realities construction at one or a plurality of locations where their source(s) are acquired 223; in some examples digital realities construction at a location remote from where source(s) are acquired 223; in some examples digital realities construction by multiple parties utilizing one or a plurality of the same sources 223; in some examples digital realities reconstruction by one or a plurality of parties who receive a previously constructed digital reality 223; in some examples broadcasting a constructed digital reality from its source 223; in some examples broadcasting a constructed digital reality from one or a plurality of construction locations remote from where source(s) are acquired 223; in some examples broadcasting one or a plurality of reconstructed digital realities from one or a plurality of reconstruction locations 223; in some examples one or a plurality of services for publishing constructed digital realities and/or reconstructed digital realities 223; in some examples one or a plurality of services for finding and utilizing constructed digital realities 223; in some examples one or a plurality of growth systems for assisting in monetizing constructed digital realities 223 such as providing assistance in some examples in revenue growth 223, in some examples in audience growth 223, and in some examples other types of growth 223. In some examples ARTPM multiple identities 224 include means for life expansion as an alternative for medical science's failure to produce meaningful life extension; in some examples by establishing and enjoying a plurality of identities and lifestyles in parallel such as in some examples public identities 224, in some examples private identities 224, and in some examples secret identities 224. In some examples ARTPM governances 225 are not governments and provide independent and separate means for various types of governance 225 such as in some examples self-governances by individuals 225; in some examples economic governances by corporations 225; and in some examples trans-boarder governances with centralized management that are based on larger goals and beliefs 225; and in some examples one or a plurality of governances may include an independent self-selected GRS (Governances Revenue System) 225. In some examples an ARTPM freedom from dictatorships system 226 includes means for individuals who live oppressed under one or a plurality of dictatorial governments to establish independent, free and secret identities 226 outside the reach of their oppressive government 226.

Figure 14:
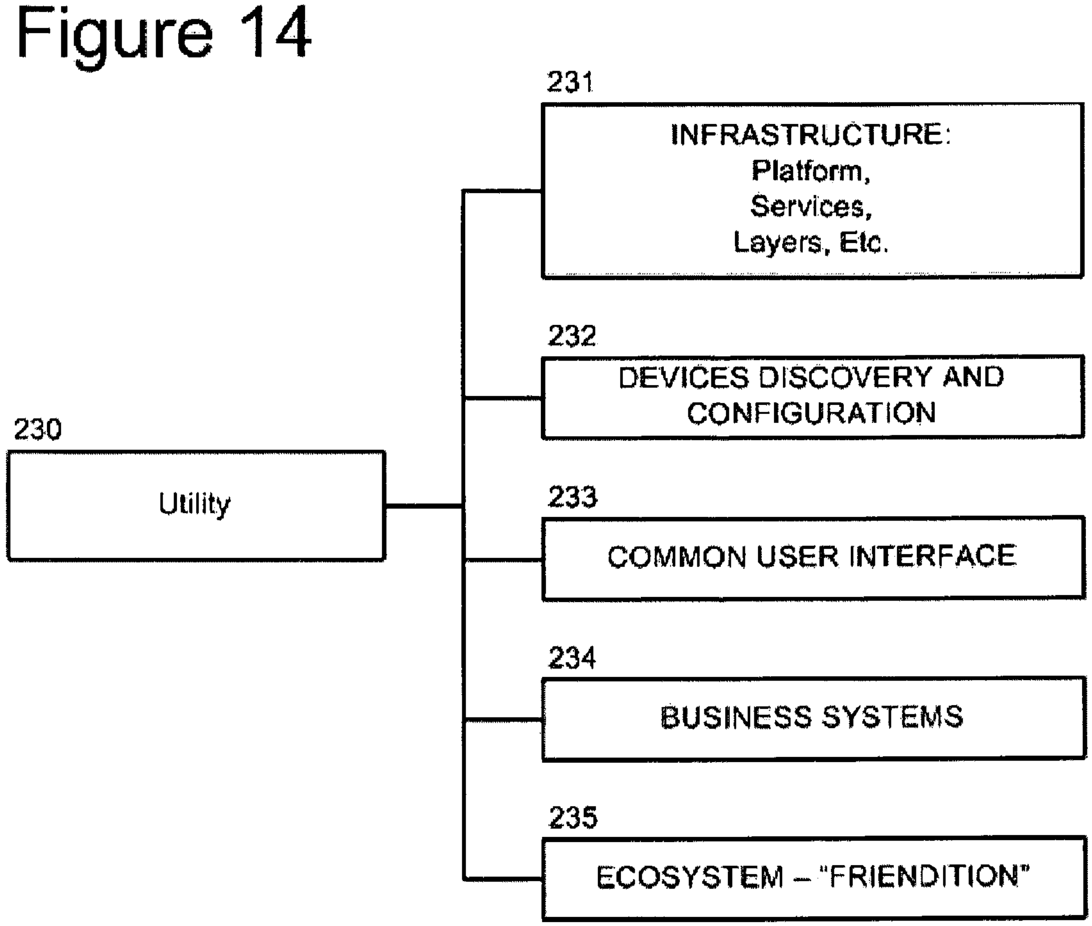
FIG. 14 is a hierarchical chart that illustrates a logical summary grouping of some utility components in the ARTPM.

Turning now to FIG. 14 in some examples one or a plurality of ARTPM utilities 230 includes in some examples one or a plurality of infrastructure components 231; in some examples devices discovery and configuration 232 for one or a plurality of ARTPM devices; in some examples a common user interface for one or a plurality of ARTPM devices 233; in some examples a common user interface for one or a plurality of ARTPM devices access 233; in some examples one or a plurality of business systems 234; and in some examples an ecosystem 235 herein named "friendition."

Figure 15:
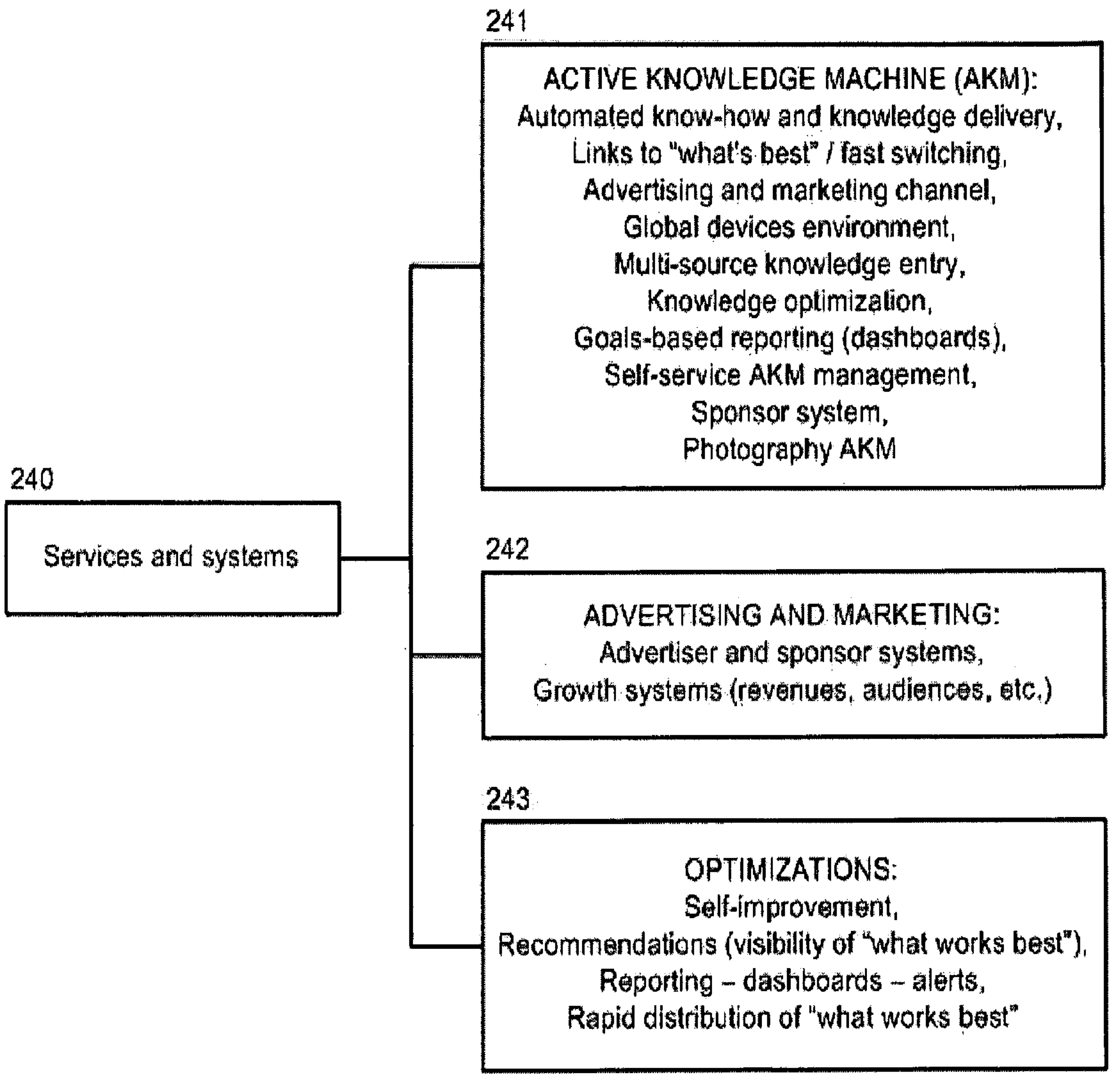
FIG. 15 is a hierarchical chart that illustrates a logical summary grouping of some services and systems components in the ARTPM.

Turning now to FIG. 15 in some examples one or a plurality of ARTPM services and systems 240 include in some examples an AKM (Active Knowledge Machine) 241, in some examples advertising and marketing 242, and in some examples optimization 243. In some examples an ARTPM AKM (Active Knowledge Machine) 241 includes in some examples recognition of user needs during the use of one or a plurality of some networked electronic devices, with automated delivery of appropriate know-how and other information to said user at the time and place it is needed 241; in some examples other AKM delivered information includes "what's best" for the user's task 241; in some examples other AKM delivered information includes means to switch to "what's best" for the user's task 241 such as in some examples different steps 241, in some examples a different process 241, in some examples buying a different product 241, and in some examples making other changes 241; in some examples an AKM may provide a usage-based channel for in some examples advertising 241, in some examples marketing 241, and in some examples selling 241; in some examples an AKM includes multi-source(s) entry it's delivered know-how by one or a plurality of sources 241; in some examples an AKM includes optimization to determine the best know-how to deliver 241; in some examples an AKM includes goals-based reporting 241 such as in some examples dashboards 241, in some examples recommendations 241, in some examples alerts 241, and in some examples other types of actionable reports 241; in some examples an AKM includes self-service management of settings and/or controls 241; in some examples an AKM includes means for improving the use of digital photographic equipment 241. In some examples an ARTPM includes advertising and marketing 242 including in some examples advertiser and sponsor systems 242; and in some examples one or a plurality of growth systems for in some examples tracking and analyzing appropriate data, in some examples providing assistance determining revenue growth opportunities, in some examples determining audience growth opportunities, and in some examples determining other types of growth opportunities. In some examples an ARTPM includes optimizations 243 including in some examples means for self-improvement of one or a plurality of its services 243; in some examples means for determining one or a plurality of types of improvements and making visible to one or a plurality of users in some examples results data 243, in some examples "what works best" data 243, in some examples gap analysis between an individual's performance and average "best performance" 243, in some examples alerts 243, and in some examples other types of recommendations 243; in some examples optimization reporting 243 such as in some examples reports 243, in some examples dashboards 243, in some examples alerts 243, in some examples recommendations 243, and in some examples other means for making visible both current performance and related data such as in some examples comparisons to and/or gaps with current performance 243; in some examples optimization distribution 243 such as in some examples enabling rapid switching to "what works best" 243, and in some examples enabling rapid copying of one or a plurality of versions of "what works best" 243.

Figure 16:
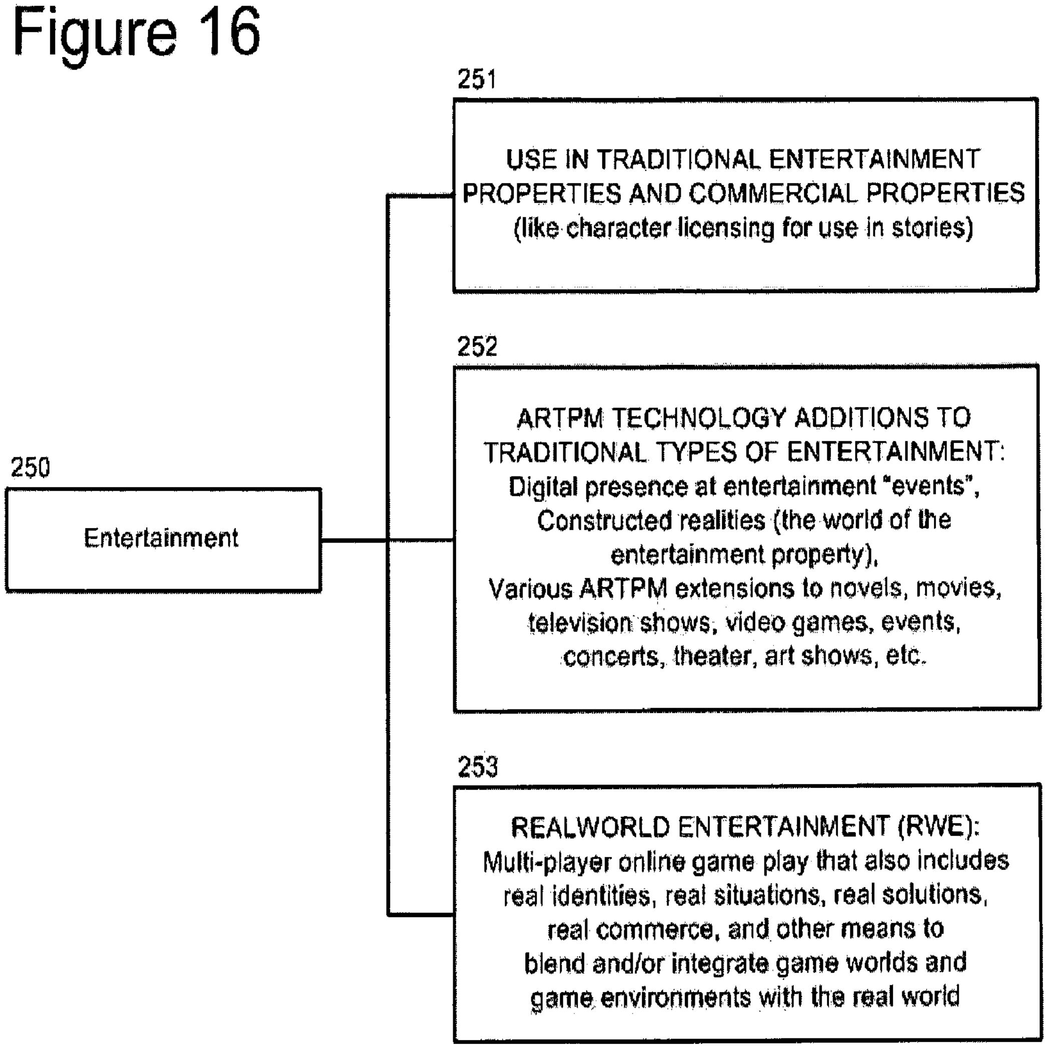
FIG. 16 is a hierarchical chart that illustrates a logical summary grouping of some entertainment components in the ARTPM.

Turning now to FIG. 16 in some examples one or a plurality of types of ARTPM entertainment(s) 250 include in some examples traditional licensing 251, in some examples ARTPM additions to traditional types of entertainment 252, and in some examples one or a plurality of new forms of online entertainment 253 that blend online entertainment games with the real world. In some examples an ARTPM includes entertainment licensing 251 that in some examples encompasses traditional licensing for use of one or a plurality of ARTPM components in traditional entertainment properties 251, in some examples traditional licensing for use of one or a plurality of ARTPM components in commercial properties 251. In some examples an ARTPM includes technology additions to traditional types of entertainment 252 such as in some examples digital presence by one or a plurality of digital audience members at digital entertainment "event's" 252; in some examples constructed digital realities that provide the "world" of a specific entertainment property 252; in some examples various ARTPM extensions to traditional entertainment properties 252 and/or entertainment series 252 such as in some examples novels 252, in some examples movies 252, in some examples television shows 252, in some examples video games 252, in some examples events 252, in some examples concerts 252, in some examples theater 252, in some examples musicals 252, in some examples dance 252, in some examples art shows 252, in some examples other types of entertainment properties 252. In some examples an ARTPM includes one or a plurality of RWE's (RealWorld Entertainment) 253 such as in some examples a multiplayer online game that includes known types of game play with virtual money, and also includes in some examples one or a plurality of real identities, in some examples one or a plurality of real situations, in some examples one or a plurality of real solutions, in some examples one or a plurality of real corporations, in some examples one or a plurality of real commerce transactions with real money, in some examples one or a plurality of real corporations that are players in the game, and in some examples other means that blend and/or integrate game worlds and game environments with the real world 253.

SUMMARY OF SOME TP DEVICES AND COMPONENTS: Look around from where you are sitting or standing. You are physically present and as walk around a room the view you see changes. If you stand so the closest window is about 3 to 4 feet away from you and look through it, then take two steps to the left what you see through the window changes; and if you take three or four steps to the right what you see through the window changes again. If you step forward you can see farther down and up through the window, and as you walk backward the view through the window narrows. Physical presence is immediate, simple and direct. As you move your view moves and what you see changes to fit your position relative to the physical world. This is not how a television screen works, nor is this not how a typical digital screen works. A screen shows you one fixed viewpoint and as you move around it stays the same. The same is true for a PC monitor, a handheld tablet's display, or a cell phone's screen. As you move relative to the screen the screen's view stays the same because your only "presence" is your physicalreality, and there is no "digital reality" or "digital presence"—your screens are just static screens within your physical reality, so your actions are not connected to any "digital place." Your TV, PC, laptop, netbook, tablet, pad and cell phone are just screens, not Teleportals.

Teleportal use introduction: Now imagine that you are looking into a Teleportal which is a digital device whose display in some examples is about same size and shape as the physical window you were just standing in front of, the window that you were looking through. Also imagine that you have one or a plurality of personal identities, as described elsewhere. Also imagine that each identity has one or a plurality of Shared Planetary Life Spaces (SPLS's), as described elsewhere. You are logged in as one of your identities, and have one of your SPLS's open. Across the bottom of the Teleportal you can see SPLS members who are present, each in a small video window. You are all present together but you have video only, not audio because they are all in the background, just as if they were on the same physical street with you but far enough away that you could not hear their conversations. When you want to talk or work with one of them you make that a focused connection, which expands its size and immediacy. Now you and that person are fully present together with a larger video image and two-way audio. You decide to stand while together and as you move around in front of the focused connection your view of that person, and your view into their place and background changes based upon your perspective and view into it, just as it you were looking in on them through a real physical window, plus your view has digital controls with added capabilities so that you have an (optional) "Superior Viewer" as described elsewhere. This is a single Teleportal "focused connection." You can add another SPLS member to this focused connection and you have the option of keeping each focused connection visible and separate on your Teleportal, or combining them into a single combined focused connection. That combined connection extracts each of those two SPLS members from their focused connections, and combines them with or without a background. If you choose to include a background you select it—the background may be one of their real locations, it may be your location, or you may choose any real or virtual location in the world to which you have access. Similarly, the others present in the combined focused connection may choose the same background you select, or they may each choose any real or virtual background they prefer. If you want, any of you may add resources such as computing, presentations, data, applications, enterprise business systems, websites, web resources, news, entertainment, live places such as the world's best beachfront bars, stored shows, live or recorded events, and much more—as described elsewhere. Each of you has a range of controls to make these changes, along with the size of focused connection, it's placement on the Teleportal, or other alterations and combinations as described elsewhere.

ARTPM reality introduction: In the same way that your SPLS's members have presence in your Teleportal in real time (even if most or all of them are not in a focused connection), you are also a member of each of their SPLS's—and that gives you presence in their Teleportals simultaneously, and you are available for an immediate focused connection by any of them. Because you have presence a plurality of others' SPLS's and their Teleportals, your digital presence is simultaneous in multiple virtual places at one time. Because you have control over your presence in each of others' SPLS's, including attributes described elsewhere such as visibility, personal data, boundaries, privacy, secrecy, etc. your level of privacy is what you choose it to be and you can expand or contract your privacy at any time in any one or more SPLS's, or outside of those SPLS's by other means as described elsewhere. In some examples this is instantiated as an Alternate Realities Machine (herein ARM) which provides new systems for control over digital reality. Because you have control over each of your SPLS's boundaries as described elsewhere such as in the ARM, you may filter out what you do not like, prioritize what you include, and set up new types of filters such as Paywalls for what you are willing to include conditionally. This means that one person may customize the digital reality for one SPLS, and make each SPLS's reality as different as they want it to be from their other digital realities. Since each SPLS is connected to an identity, one person may have different identities that choose and enjoy different types of realities—such as family, profession, travel, recreation, sports, partying, punk, sexual, or whatever they want to be—and each identity and SPLS may choose privacy levels such as public, private or secret. This provides privacy choices instead of privacy issues, with self-controlled choices over what is public, what is private and what is secret. Similarly, culture is transformed from top-down imposition of common messages into self-chosen multiple identities, each with the different type(s) of digital boundaries, filters, Paywalls and preferences they want for that identity and its SPLS's. Thus, the types of culture and level of privacy in each digital reality is a reflection of a person's choices for each of his or her realities.

Optimization overlay: The ARTPM reverses the assumption that the primary purpose of networks is to provide connections and communications. It assumes that is secondary, and the primary purpose of networks is to identify behavior, track it and respond to success and failure (based on what can be determined). Tracked behaviors and their results are aggregated as described elsewhere, and reported both individually and collectively as described elsewhere, so the most successful behaviors for a range of goals is highly visible. Aggregate visibility provides self-chosen opportunities for individuals to advance rapidly, in some examples to "leap ahead" across a range of in some examples goals, in some examples device uses, in some examples tasks, etc. An Active Knowledge Machine, for one example, (herein AKM) delivers explicit "success guidance" to individuals at the point of need while they are doing a plurality of types of tasks. Thus, with an ARTPM some networks may start delivering human success so a growing number of people may achieve more of their goals, with the object of a faster rate of progress and growth.

Digital reality summary: In this new digital reality you simultaneously have presence in one or a plurality of digital locations as the one or multiple identities you choose to be at that moment, in the one or multiple Shared Planetary Life Spaces in which you choose to be present, in some examples with an ARM that enables setting its boundaries so that each reality is focused on what you want it to be, and in some examples with an AKM that keeps you informed of the most successful steps and options while you are doing tasks. With Teleportal controls you may include other IPTR (herein Identities [people], Places, Tools or Resources) by means of SPLS's, directories, the Web, search, navigation, dashboards [performance reporting], AKM (Active Knowledge Machine, described elsewhere), etc. to make them all or part of your focused Teleportal connections and your digital realities. When you identify a potentially more successful digital reality or option, and want to try it, the systems that provide those choices such as the ARM or AKM, also enable fast switching to the new option(s). At any one moment while you use and look through a Teleportal your view may change dramatically by your selection of background place, and by changing your physical juxtaposition to the Teleportal which responsively alters the view that it displays to you. Similarly, the views that others have of you may also be changed dramatically by their choices of their identities, SPLS's, background, goals, fast switching to various advances and their resulting digital realities—with their Teleportals views changing as they move around and look through their Teleportals. You are both present together in a larger "Expandaverse" of a growing number of digital realities that may be changed and advanced substantially by anyone at any moment.

Teleportal devices: In some examples it is an object of Teleportal devices to introduce a new set of networked electronic devices that are able to provide continuous presence in one or a plurality of digital realities (as described elsewhere), along with other features and operations (as described elsewhere).

Figure 17A:
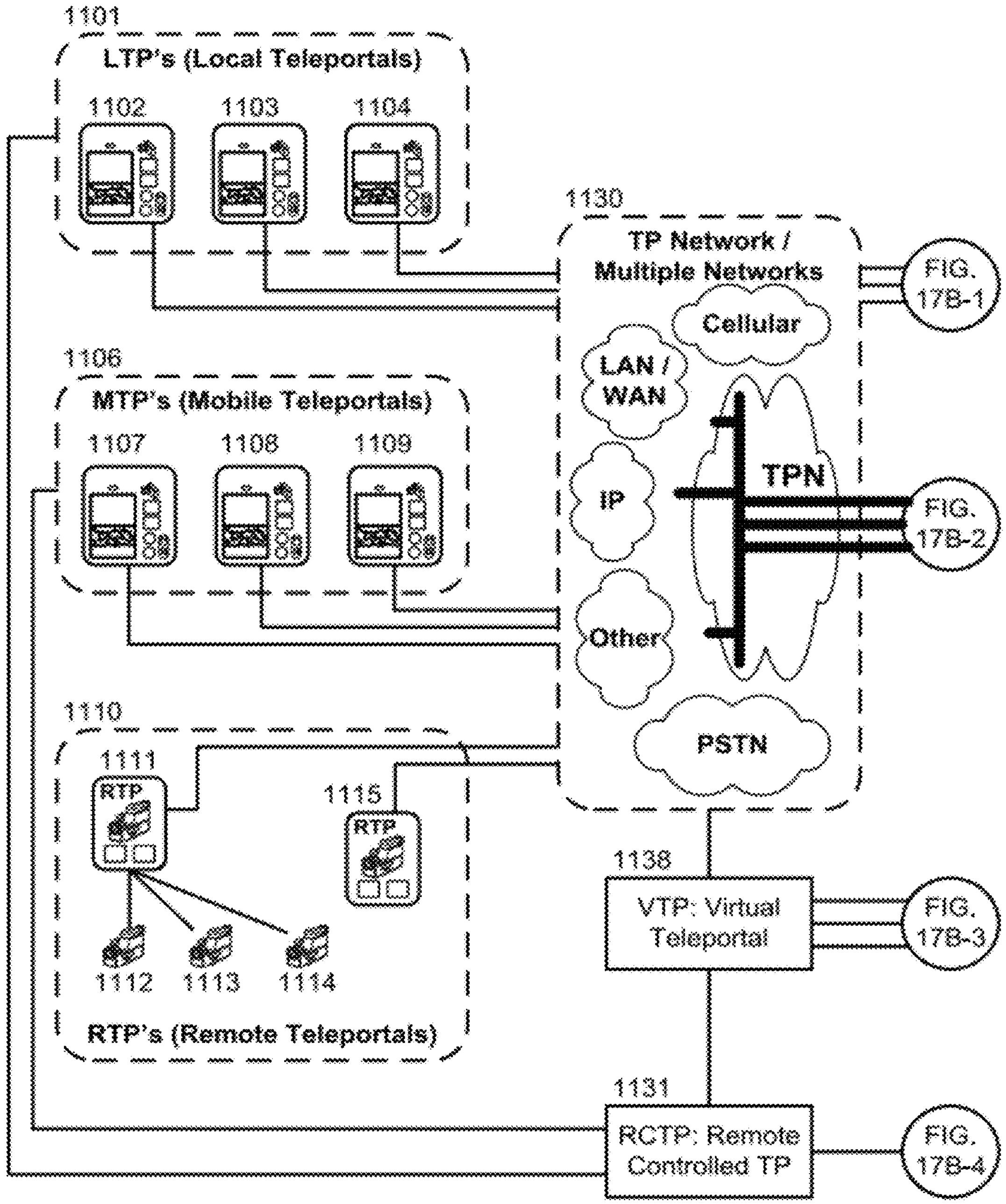
FIG. 17 is a pictorial diagram that illustrates some examples of more detailed descriptions of the main Teleportal (TP) devices and categories; and in some examples their combination as a new architecture for individual access and control over various types of networked electronic devices.
Figure 17B:
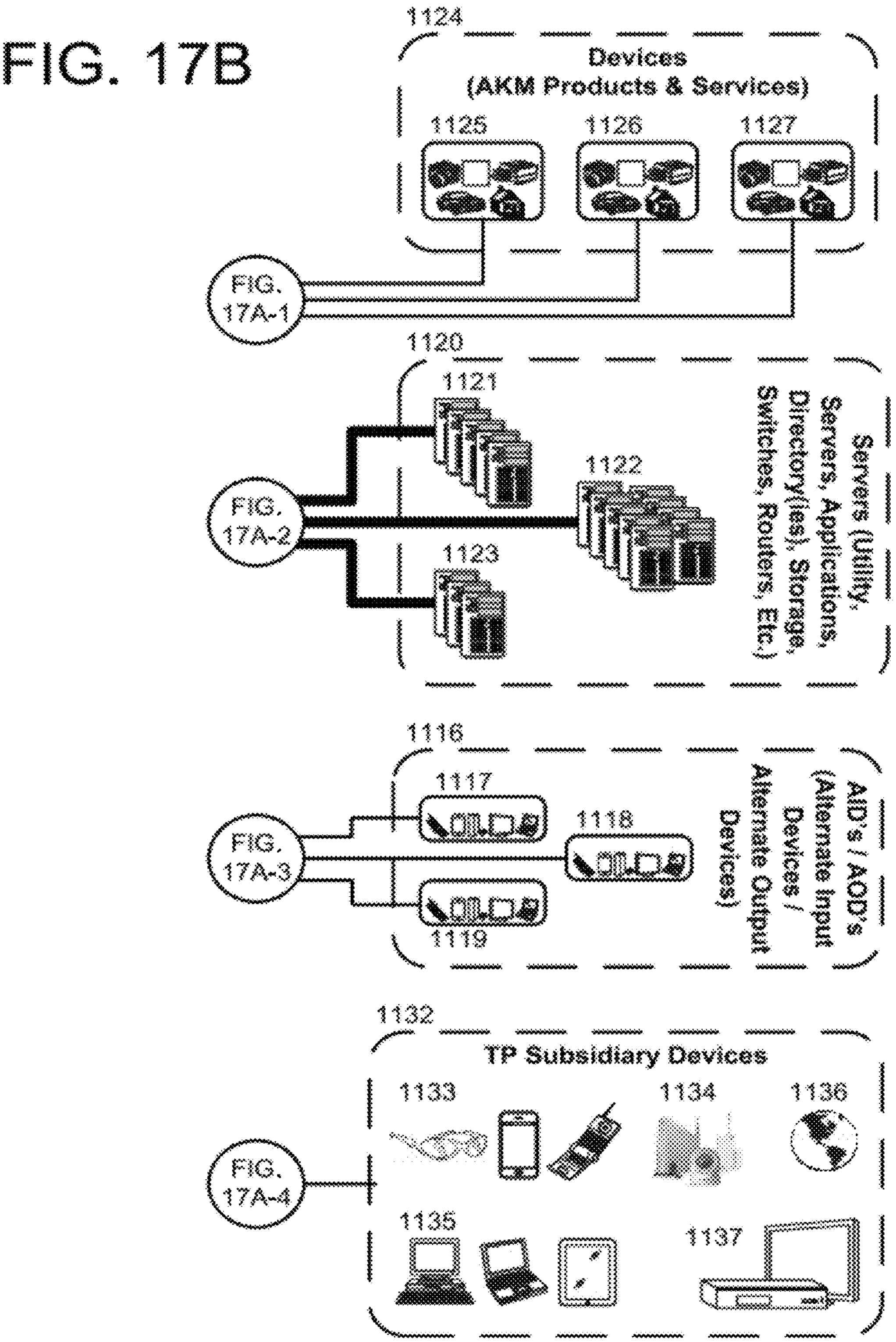

FIG. 17, "Teleportal (TP) Devices Summary": In some examples TP devices include Local Teleportals that are also referred to as LTP's (as described elsewhere), in some examples Mobile Teleportals that are also referred to as MTP's (as described elsewhere), in some examples Remote Teleportals that are also referred to as RTP's (as described elsewhere), in some examples Active Knowledge Machine devices that are also referred to as AKM devices (as described elsewhere), in some examples Alternate Input Devices/Alternative Output Devices that are also referred to as AID's/AOD's (as described elsewhere), in some examples TP Subsidiary Devices that are controlled by means of Remote Control Teleportaling that is also referred to as RCTP (as described elsewhere), in some examples Virtual Teleportal Devices that are other types of networked electronic devices that run a Virtual Teleportal that is also referred to as a VTP (as described elsewhere), in some examples a Teleportal Utility that is also referred to as a TPU (as described elsewhere), and in some examples other TP devices and connections that are described elsewhere.

Figure 18:
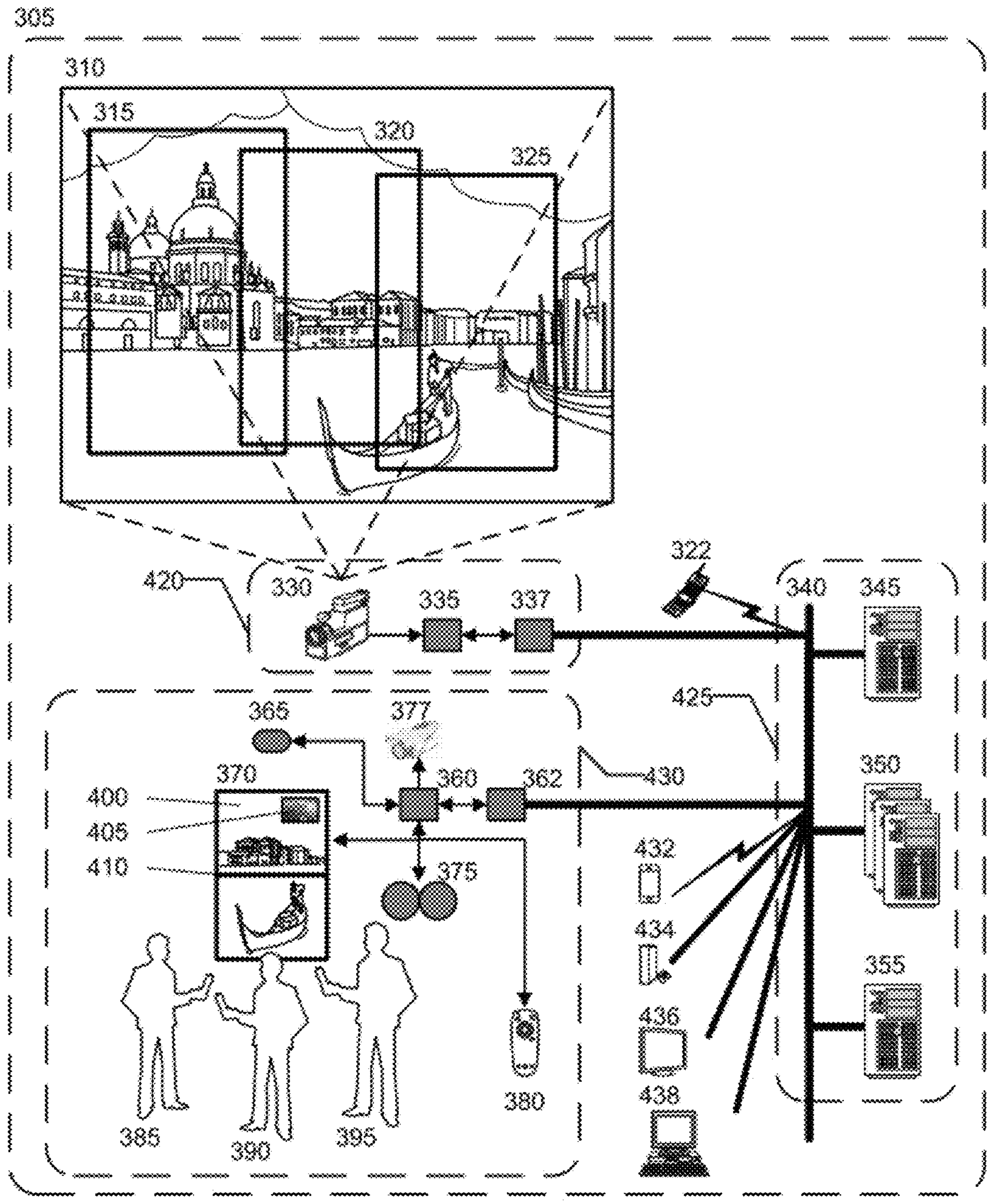
FIG. 18 is a pictorial diagram that illustrates some TP devices and components, and includes some examples of how they work together.

FIG. 18, "Summary of Some TP Devices and Connections": Some examples of TP devices are illustrated in an example focused connection that in this example includes an RTP, an LTP, various AID's/AODs, a universal remote control, a TPU, and some types of TP Servers; and in some other examples (as described elsewhere) may include other types of TP devices, features, functions, services, etc.

FIGS. 19 through 25; Some examples of LTP's are illustrated which include in some examples LTP window styles; in some examples LTP's hidden in a wall pocket so that it can be utilized as a digital window along with a real physical window; in some examples a plurality of shapes for LTP's; in some examples framed LTP's; in some examples a plurality of integrated LTP's that provide a single combined screen; in some examples TP walls that are constructed from a plurality of LTP's; and in some examples other LTP styles may be constructed from any combination of display, projector, interface, motion detection, and related components along with related processing (as described elsewhere).

Figure 26A:
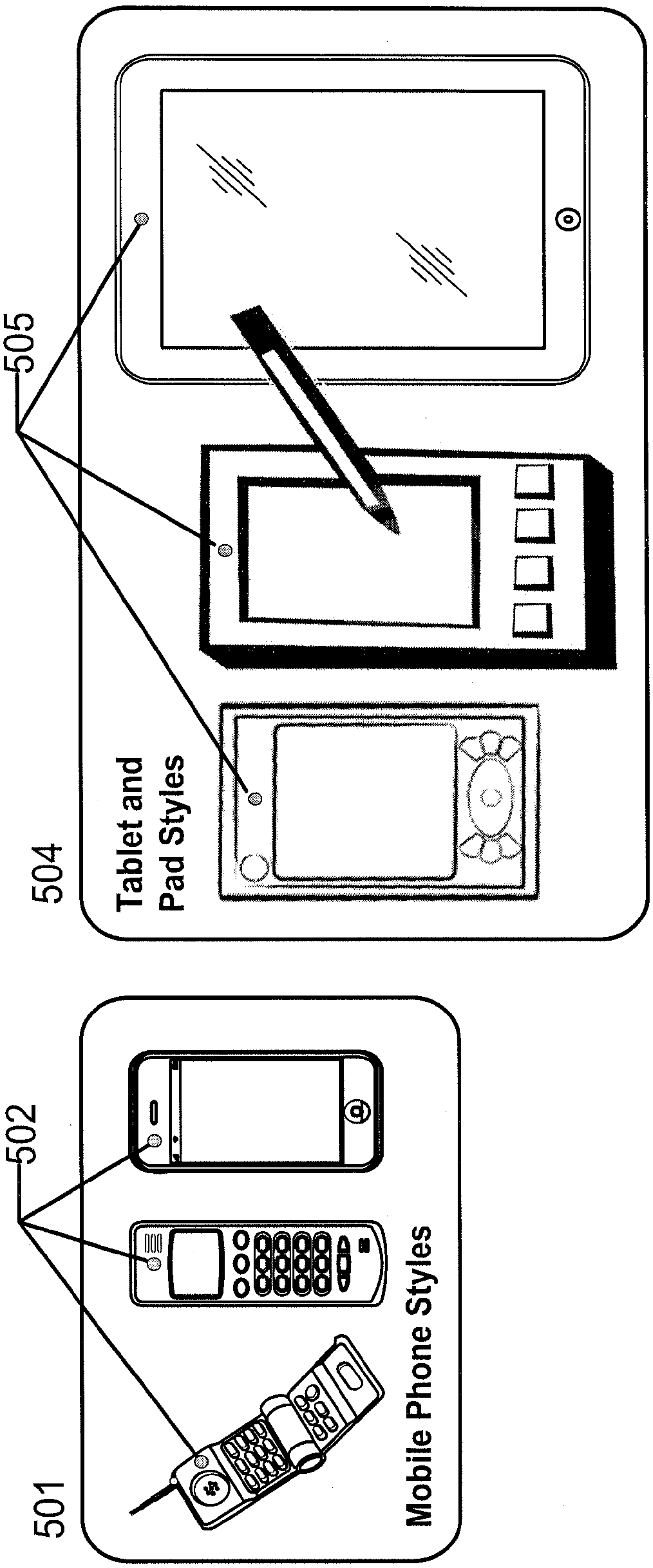
FIG. 26 is a pictorial diagram that illustrates some styles for Mobile Teleportals devices including mobile phone styles, tablet and pad styles, portable communicator styles, netbook styles, laptop styles, and portable projector styles.
Figure 26B:
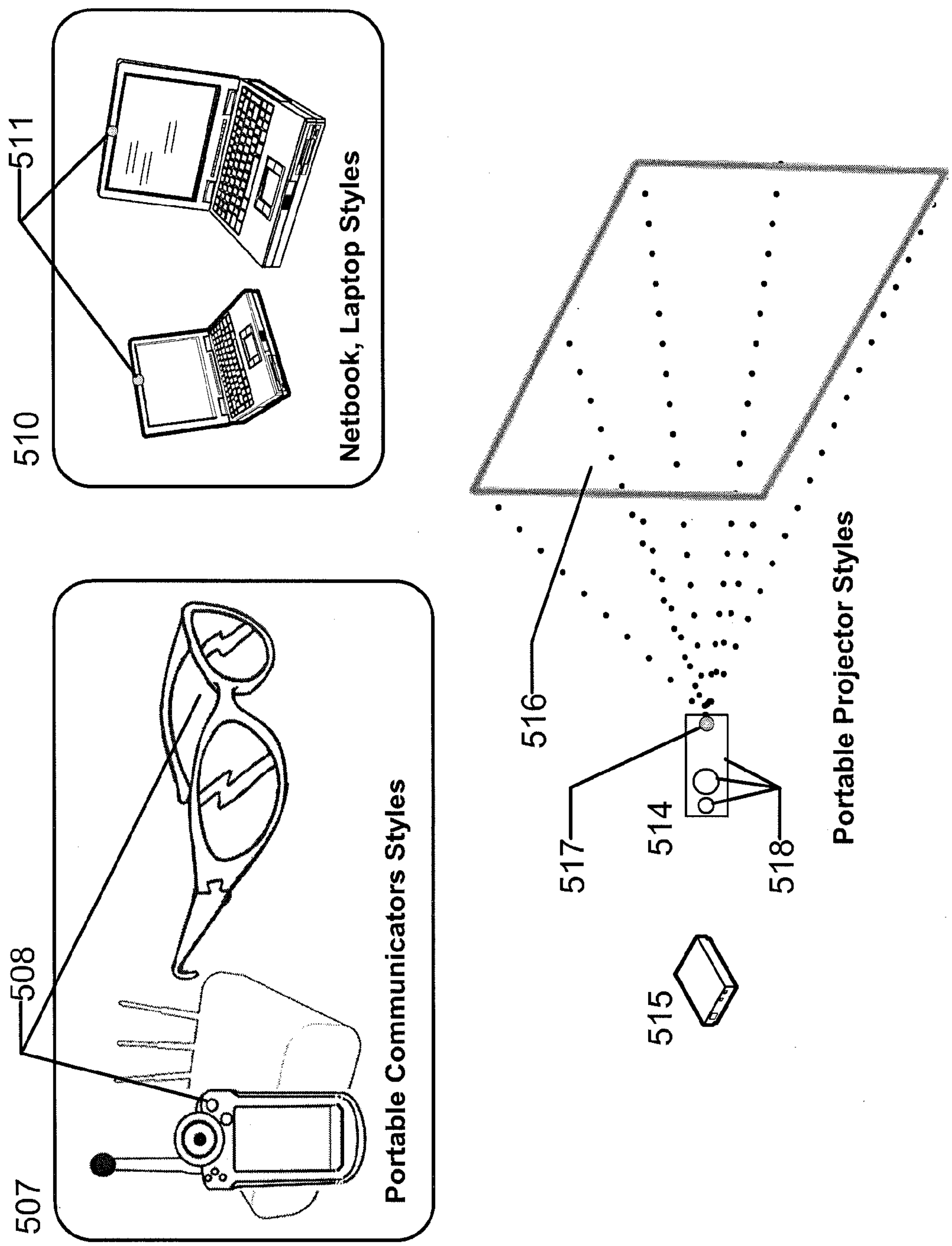

FIG. 26, "Some MTP Style Examples": Some examples of MTP styles are illustrated and described elsewhere (such as in FIG. 93) which include in some examples mobile phone styles; in some examples tablet and pad styles; in some examples portable communicators styles; in some examples wearable mobile device styles; in some examples Netbook or laptop styles; in some examples portable projector styles; and in some examples other MTP styles may be constructed from any combination of display, projector, interface, motion detection, and related components along with related processing (as described elsewhere).

Figure 27A:
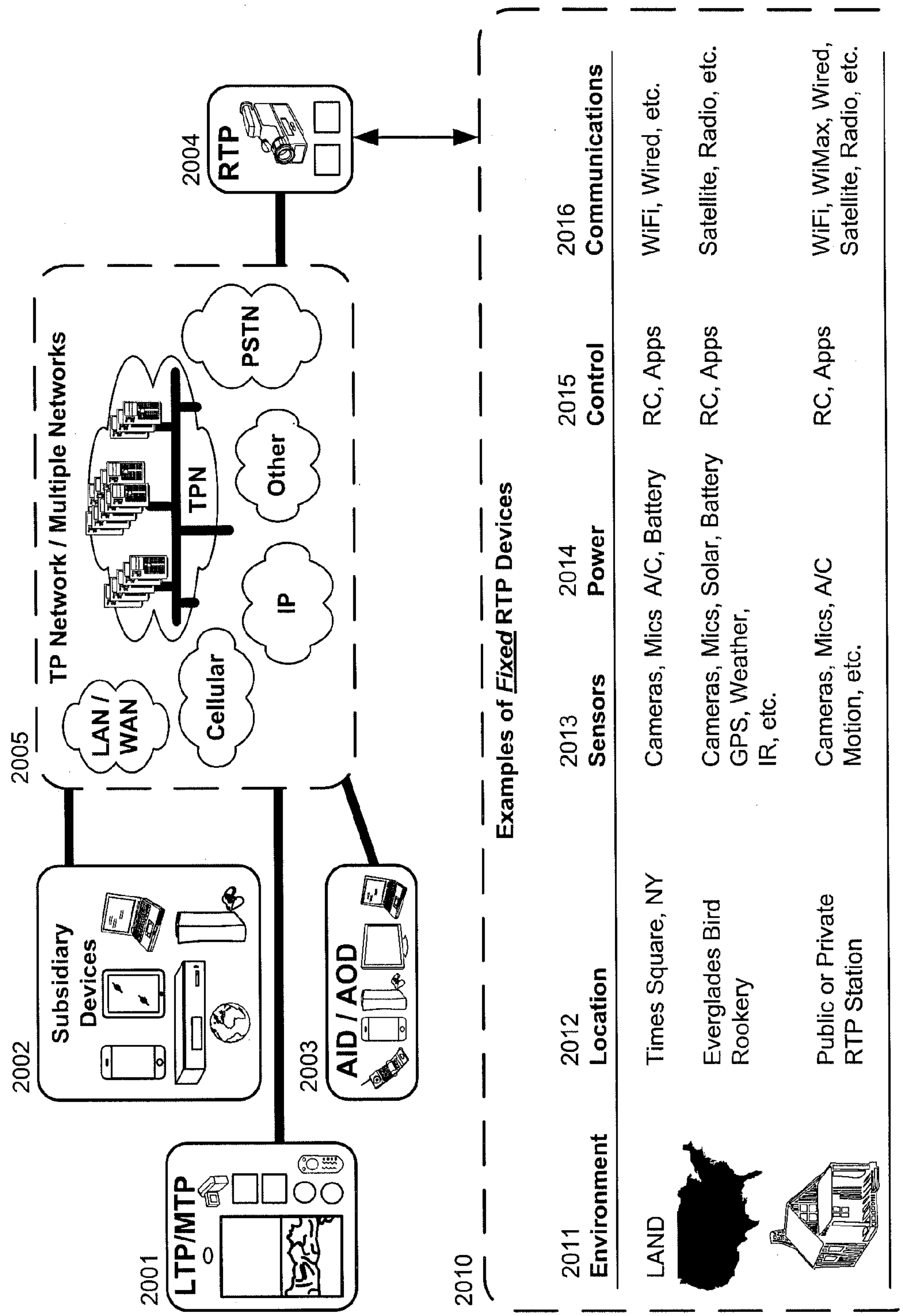
FIGS. 27 and 28 are pictorial diagrams that illustrate some styles for Remote Teleportals devices including some fixed location styles and mobile location styles such as on land, in the water, in the air, and potentially in space.
Figure 28A:
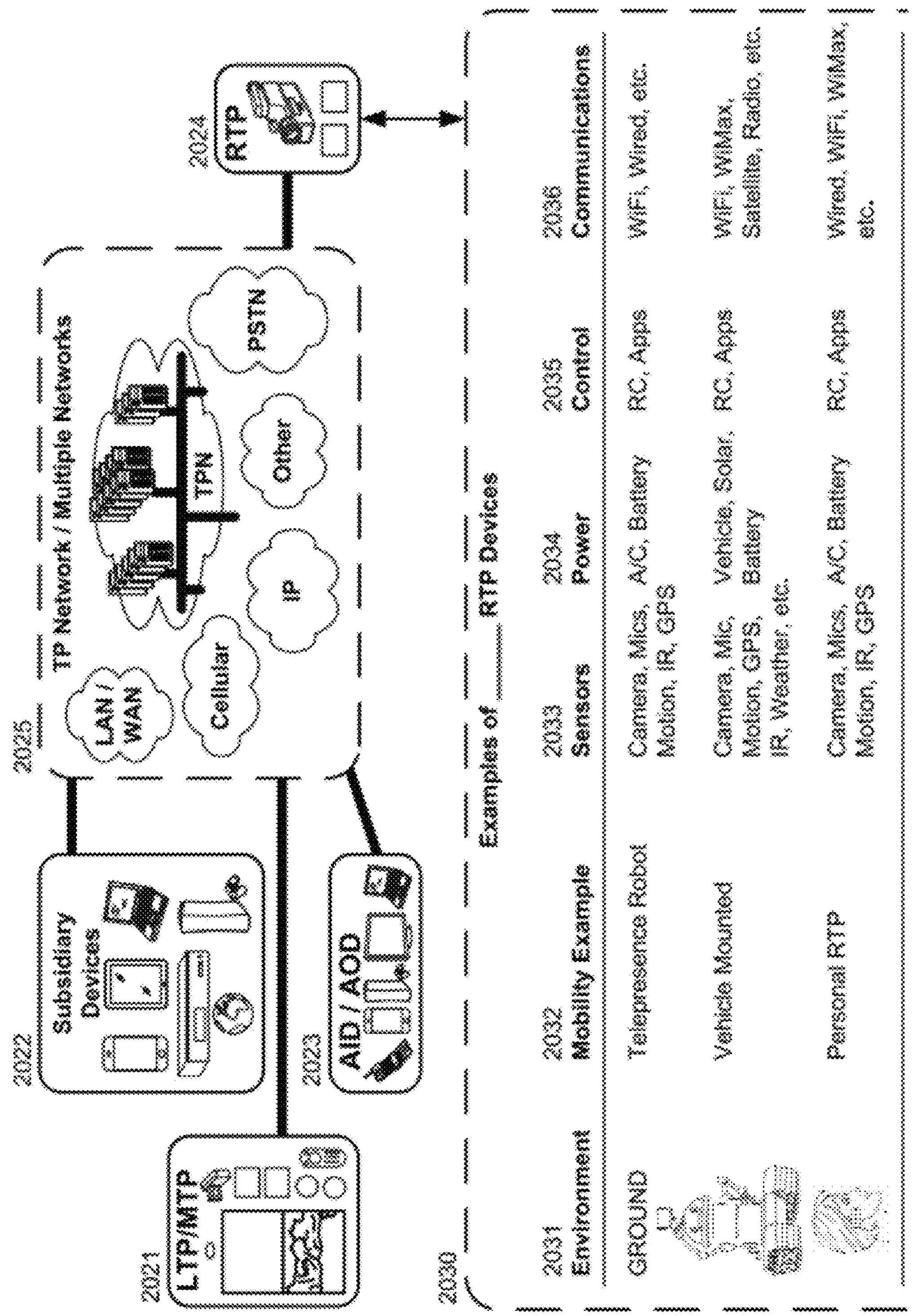

FIG. 27, "Fixed RTP Examples," and FIG. 28, "Mobile RTP Examples": Some examples of RTP styles are presented in FIG. 27 and FIG. 28 and described elsewhere which include in some examples land-based RTP examples; in some examples urban places RTP examples; in some examples nature and wildlife-based RTP examples; in some examples wearable RTP examples; in some examples portable or transportable RTP examples; in some examples hidden or concealed RTP examples; in some examples public observation RTP examples; in some examples private property RTP examples; in some examples underwater RTP examples; in some examples high-rise building fixed-location aerial RTP examples; in some examples tall tree-based fixed-location aerial RTP examples; in some examples balloon or floating device-based aerial RTP examples; in some examples airplane or drone-based aerial RTP examples; in some examples helicopter or unmanned hovering device-based aerial RTP examples; in some examples ship or boat RTP examples; in some examples rocket, satellite or spaceship-based outer space RTP examples; in some examples whose appearance is likely to take time unmanned stationary or mobile devices on other planets, asteroids, comets, or other extraterrestrial location-based RTP examples.

TP DEVICES SUMMARY: Turning to a high-level view FIG. 17, "Teleportal (TP) Devices Summary," this provides a fourth alternative to the typical user's viewpoint there are three main high-level device architectures. In the first and simplest (named "invisible OS") the device's operating system is invisible, and a user simply turns on a device (like a television, appliance, etc.) then uses it directly then turns it off, and if the device connects to other devices (like a cable TV set-top box or DVR, it communicates over a network such as a public network like the Internet—but most devices are typically different in each of their interfaces, features and functions from other devices because differentiation is a competitive advantage, so this simpler architecture often yields a hailstorm of differentiated devices. In the second and most complex (named "visible OS") the user must use the device's operating system to run the device, and Microsoft Windows is one example. A user turns on a PC which runs Windows, then the user employs Windows to load a stored program which in turn must be learned and used to perform its set of functions and then exited. To do something different a user loads a different stored program and learns it and uses it. To connect to and use a new type of electronic device the operating system must acquire its drivers, load its drivers and connect to the device; then it can use the device as part of its Windows environment. This "visible OS" provides robustness but it is also complex for users and many vendors as electronic devices add new features, and as the numbers and types of connectable electronic devices multiplies. In the third and most controlled (named "controlled OS") a single company, such as Apple with its iPhone/iPod/iPad/iTunes ecosystem, maintains control over its devices and how they connect and are kept updated. From a user's view this is simpler but the cost is a premium price for customers and tight business and technical requirements for related vendors/developers, plus the controlling company receives a substantial percentage of the sales transactions that flow through its ecosystem—a percentage many times larger than any typical royalty would ever be.

Herein some examples in FIG. 17 illustrate a fourth high-level alternative (named "Teleportal Architecture" which is referred to here as "TPA"). In some examples a TPA includes a set of core devices that include LTP's (Local Teleportals) 1101, MTP's (Mobile Teleportals) 1106, and RTP's (Remote Teleportals) 1110. In some examples these core devices (LTPs, MTPs and RTPs) utilize one or a plurality of other networked electronic devices (named TP Subsidiary Devices 1132) by remote control, herein named RCTP (Remote Control Teleporaling) 1131 1132 1101 1106 1110. In some examples one or a plurality of networked electronic devices (named AID/AOD or Alternate Input Devices/Alternate Output Devices 1116) may run a VTP (Virtual Teleportal) 1138 1116 in which they connect to and run core devices (LTPs, MTPs and RTPs). In addition, an AID/AOD 1116 running a VTP 1138 may utilize a core device 1101 1106 1110 to control and use one or a plurality of subsidiary devices 1131 by means of RCTP 1131.

In some examples said TPA provides a fourth overall interconnection model for an environment that includes a plurality of disparate types of networked electronic devices: in some examples the core devices (LTPs, MTPs and RTPs) 1101 1106 1110 are the primary devices employed; in some examples the core devices (LTPs, MTPs and RTPs) 1101 1106 1110 use remote control (RCTP) 1131 to connect to and utilize one or a plurality of other networked electronic devices (TP Subsidiary Devices) 1132; in some examples one or a plurality of other types of networked electronic devices (AID's/AOD's) 1116 utilize a virtual teleportal (VTP) 1138 to connect to and use the core devices (LTPs, MTPs and RTPs) 1101 1106 1110; and in some examples the other networked electronic devices (AID's/AOD's) 1116 1138 may use the core devices (LTPs, MTPs and RTPs) 1101 1106 1110 to connect to and control the subsidiary devices (TP Subsidiary Devices by means of RCTP) 1131 1132.

In summary, this TPA model simplifies a broad evolution of a plurality of disparate networked electronic devices into core devices (LTPs, MTPs and RTPs) 1101 1106 1110 at the center with RCTP connections and control 1131 1132 going outward, and VTP connections and control 1116 1138 coming inward. Furthermore, a plurality of components (as described elsewhere) such as in some examples a consistent (and adaptive) user interface, simplify the connections to and use of networked electronic devices across the TPA.

In some examples of a TPA these devices (core devices, TP subsidiary devices, alternate input devices and alternate output devices) utilize one or a plurality of disparate public and/or private networks 1130; in some examples one or a plurality of these networks is a Teleportal Network (herein TPN) 1130; 1130; in some examples one or a plurality of these networks is a public network such as the Internet 1130; in some examples one or a plurality of these networks is a LAN 1130; in some examples one or a plurality of these networks is a WAN 1130; in some examples one or a plurality of these networks is a PSTN 1130; in some examples one or a plurality of these networks is a cellular radio network such as for mobile telephony 1130; in some examples one or a plurality of these networks is another type of network 1130; in some examples one or a plurality of these networks may employ a Teleportal Utility (herein TPU) 1130, and in some examples one or a plurality of these networks may employ in some examples Teleportal servers 1120, in some examples Teleportal applications 1120, in some examples Teleportal services 1120, in some examples Teleportal directories 1120, and in some examples other networked specialized Teleportal components 1120.

Turning now to a somewhat more detailed view FIG. 17, "Teleportal (TP) Devices Summary," illustrates some examples of TP devices, which are described elsewhere. In some examples a TP device is a stand-alone unit that may connect over a network with one or a plurality of stand-alone TP devices. In some examples a TP device is a sub-unit that is an endpoint of a larger system that in some examples is hierarchical, in some examples is point-to-point, in some examples employs a star topology, and in some examples utilizes another known network architecture, such that the combination of TP device endpoints, switches, servers, applications, databases, control systems and other components combine to form part or all of an overall system or utility with a combination of methods and processes. In some examples the types of TP devices, which are described elsewhere, include an extensible set of devices such as LTP's (Local Teleportals) 1101, MTP's (Mobile Teleportals) 1106, RTP's (Remote Teleportals) 1110, AID's/AODs (Alternative Input Devices/Alternative Output Devices) 1116 connected by means of VTP's (Virtual Teleportals) 1138, Servers (servers, applications, storage, switches, routers, etc.) 1120, TP Subsidiary Devices 1132 controlled by RCTP (Remote Control Teleportaling) 1131, and AKM Devices (products and services that are connected to or supported by the Active Knowledge Machine, as described elsewhere) 1124. In some examples a consistent yet customizable user interface(s) is supported across TP devices 1101 1106 1110 1138 1116 1120 1124 1131 1132 as described elsewhere; which provides similar and predictable accessibility to the functionality and capabilities provided by TP devices, applications, resources, SPLS's, IPTR, etc. In some examples voice recognition plays an interface role so that TP devices 1101 1106 1110 1138 1116 1120 1124 1131 1132 and Teleportal usage may be controlled in whole or in part by voice commands; in some examples gestures such as on a touch screen or in the air by means of a hand-held or hand-attached controller plays an interface role so that TP devices 1101 1106 1110 1138 1116 1120 1124 1131 1132 and Teleportal usage may be controlled in whole or in part by gestures; in some examples other known interface modules or capabilities are employed to control TP devices 1101 1106 1110 1138 1116 1120 1124 1131 1132 and Teleportal usage as described elsewhere.

In some examples these devices and interfaces utilize one or a plurality of networks such as a Teleportal Network (TPN) 1130, LAN 1130, WAN 1130, IP (such as the Internet) 1130, PSTN (Public Switched Telephone Network) 1130, cellular 1130, circuit-switched 1130, packet-switched 1130, ISDN (Integrated Services Data Network) 1130, ring 1130, mesh 1130, or other known types of networks 1130. In some examples one or a plurality of TP devices 1101 1106 1110 1138 1116 1120 1124 1131 1132 are connected to a LAN (Local Area Network) 1130 in which the extensible types of components in FIG. 17 reside on that LAN 1130. In some examples one or a plurality of TP devices 1101 1106 1110 1138 1116 1120 1124 1131 1132 are connected to a WAN (Wide Area Network) 1130 in which the extensible types of components in FIG. 17 reside on that one said WAN 1130. Similarly, in some examples one or a plurality of TP devices 1101 1106 1110 1138 1116 1120 1124 1131 1132 are connected to any of the other types of known networks 1130, such that the extensible types of components in FIG. 17 reside on one type of network 1130. In some examples two networks 1130 or a plurality of networks 1130 are connected such as for example the Internet, in some examples by converged communications links that support multiple types of communications simultaneously such as voice, video, data, e-mail, Internet phone, focused TP communications, fax, remote data access, remote services, Web, Internet, etc. and include various types of known interfaces, protocols, data formats, etc. which enable said internetworking.

FIG. 17 illustrates some examples of connections between LTP's 1102 1103 1104, in which connections between the LTP's 1102 1103 1104, and connections between LTP's and other TP devices 1106 1110 1138 1116 1120 utilizes one or a plurality of networks 1130, and in some examples one or a plurality of network resources 1120 1121 1122 1123. FIG. 17 also illustrates some examples of connections between MTP's 1107 1108 1109, in which connections between the MTP's 1107 1108 1109, and connections between MTP's and other TP devices 1101 1110 1138 1116 1120 utilizes one or a plurality of networks 1130, and in some examples one or a plurality of network resources 1120 1121 1122 1123. FIG. 17 also illustrates some examples of connections between RTP's 1111 1115, in which connections between the RTP's and other TP devices 1101 1106 1138 1116 1120 utilizes one or a plurality of networks 1130, and in some examples one or a plurality of network resources 1120 1121 1122 1123. FIG. 17 also illustrates some examples of connections, by means of one or a plurality of VTP's (Virtual Teleportals) 1131, between AID's/AOD's 1117 1118 1119, in which connections between the AID's/AOD's and other TP devices 1101 1106 1110 1120 1131 1132 utilizes one or a plurality of networks 1130, and in some examples one or a plurality of network resources 1120 1121 1122 1123. FIG. 17 also illustrates some examples of connections between network resources (in some examples a utility[ies], servers, in some examples applications, in some examples directory[ies], in some examples storage, in some examples switches, in some examples routers, in some examples other types of network services or components) 1121 1122 1123, in which connections between the network resources and other TP devices 1101 1106 1110 1138 1116 utilizes one or a plurality of networks 1130, and in some examples one or a plurality of other network resources 1120 1121 1122 1123. FIG. 17 also illustrates some examples of connections, by means of one or a plurality of RCTP's (Remote Controlled Teleportals) 1131, between TP devices 1101 1106 1138 1116 and TP subsidiary devices 1132 which in some examples include mobile phones 1133, other types of access devices 1133, cameras 1134, sensors 1134, other types of endpoint interfaces 1134, PCs 1135, laptops 1135, networks 1135, tablets 1135, pads 1135, online games 1135, Web browsers 1136, Web applications 1136, websites 1136, online televisions 1137, cable TV set-top boxes 1137, DVR's 1137, etc., in which in some examples the link to the TP subsidiary devices 1132 is direct, and in some examples the link to the TP subsidiary devices 1132 utilizes one or a plurality of networks 1130, and in some examples the link to the TP subsidiary devices 1132 utilizes one or a plurality of network resources 1120 1121 1122 1123. Similarly, in some examples one or a plurality of TP devices 1101 1106 1110 1116 1120 1124 1131 1132 are connected to any of the other types of TP devices 1101 1106 1110 1116 1120 1124 1131 1132 by means of networks 1130 as described elsewhere, such that the extensible types of components in FIG. 17 are connected to and interact with each other as described elsewhere. FIG. 17 also illustrates some examples of connections between AKM Devices (herein the Active Knowledge Machine, as described elsewhere) 1125 1126 1127, in which connections between the AKM Devices and AKM network resources 1121 1122 1123 utilizes one or a plurality of networks 1130, and in some examples one or a plurality of network resources 1120 1121 1122 1123.

The illustration in FIG. 17 merely illustrates some examples and actual configurations of TP devices 1101 1106 1110 1138 1116 1120 1124 1131 1132 connected to one or a plurality of networks 1130 will utilize choices of devices, hardware, software, servers, operating systems, networks, and other components that employ features and capabilities that are described elsewhere, to fit a particular configuration and a particular set of desired features. In some examples multiple components and capabilities may be incorporated into a single hardware device, such as in some examples one TP device such as one RTP 1111 may control multiple subsidiary devices such as external cameras and microphones 1112 1113 1114; and in some examples one hardware purchase may include part or all of an individual's TP lifestyle that includes a server and applications 1121 with a specific set of TP devices 1102 1107 1111 1112 1138 1117 1131 1133 1134 1135 1137 1125 such that the combination of TP devices actually constitutes one hardware purchase that fulfills one person's chosen set of TP needs and TP uses. In some examples the TP devices 1101 1106 1110 1138 1116 1120 1124 1131 1132 and network(s) 1130 may be owned and managed in various ways; in some examples a customer may own and manage an entire system; in some examples a third-party(ies) may manage a customer owned system; in some examples a third-party(ies) may own and manage an entire system in which some or all TP devices and/or services are rented or leased to customers; in some examples any known business model for providing hardware, software, and services may be employed.

Summary of some TP devices and connections: Some examples in FIG. 18 illustrates and further describe TP devices described herein. Turning now to some examples in FIG. 18 an overall summary 305 includes a Local Teleportal (LTP) 430, a Remote Teleportal (RTP) 420, a Teleportal Network (TPN) 425, which includes a Teleportal Shared Spaces Network (TPSSN) 425 and in some examples a Teleportal Utility (TPU) 425. Though the ARTPM is not limited to the elements in this figure, the components included are utilized to connect a user 390 in real-time with the Grand Canal in Venice, Italy 310. Without needing multiple cameras this one wide and tall remote view 310 is processed by the Local Teleportal's 430 processor(s) 360 to provide a varying view 315 320 325 of the Grand Canal 310, along with audio that is played over the Local Teleportal's speaker(s) 375. The viewpoint place displayed in the Local Teleportal 370 reflects how the view in a real local window changes dynamically as a viewer(s) 390 moves. The view displayed in the LTP 370 is therefore dynamically based on the viewer's position(s) 385 390 395 relative to the LTP 370 as determined by the LTP's SVS (Superior Viewer Sensor) 365. In some examples when a viewer stands on the left 385 of the LTP 370, the SVS 365 determines this and the LTP's processor(s) 360 displays the appropriate right portion 325 of the Grand Canal 310. In some examples as the viewer 390 moves to the center in front of the LTP 370 when the viewer reaches the center 390 then center view 320 is displayed of the Grand Canal 310, and in some examples when the viewer moves to the right 395 then left view 315 is displayed from the Grand Canal 310.

In some examples a calculated view 395 with 315, 390 with 320, 385 with 325 that matches a real window is displayed in LTP 370 by means of a SVS 365 that determines the viewer(s) position relative to the LTP, and a CPM 360 that calculates the appropriate portion of the Grand Canal 310 to display. In one example the viewer 385 stands to the left of the Teleportal 370 so he can directly see and talk to the gondolier who is located on the right of this view of the Grand Canal 325; in some examples the remote microphones 330 are 3D or stereo microphones, in which case the viewer's speakers 375 may acoustically position the sound of the gondolier's voice appropriately for the position of the gondolier in the place being viewed.

To achieve this in some examples a Remote Teleportal (RIP) 420 is at an SPLS remote place and it comprises a video and audio source(s) 330, including a processor(s) 335 that provides remotely controlled processing of video, audio, data, applications 335, storage 335 and other functions 335; and a Remote Communications Module 337 that in some examples may be attached to the Internet 340, in some examples may be attached to a Teleportal Network 340, in some examples may be attached to a RTP Hub Server 350, or in some examples may be attached to another communications network such as a private corporate WAN (Wide Area Network) 340. In some examples a Remote Teleportal 322 may include devices such as a mobile phone 322 that is capable of delivering both video and audio, and is running a Virtual Teleportal 322, and in some examples is attached wirelessly to a cell phone vendor's network 340, in some examples is attached wirelessly (such as by Wi-Fi) to the Internet 340, in some examples is attached to satellite communications 340. In some examples said RTP device 420 may possess other features such as self-propelled mobility (on the ground, in the air, in the water, etc.); in some examples said RTP device 420 may provide multicast; in some examples said RTP device 420 may dynamically alter video and audio in real-time, or in near real-time before it is transmitted (with or without informing viewers 390 that such alteration has taken place).

In some examples video, audio and other data from said RTP 420 322 are received by either a Remote Teleportal Group Server (RTGS) 345 or a Teleportal Network Hub Server (TPNHS) 350. In some examples video, audio and other data from said RTP 420 322 may be processed by a Teleportal Applications Server (TPAS) 350. In some examples video, audio and other data from said RTP 420 322 are received and stored by a Teleportal Storage Server (TPSS) 350. In some examples the owner(s) of the respective RTPs 420 322, and each RTGS 345, TPNHS 350, TPAS 350, or TPSS 350 may be wholly public, wholly private or a combination of both. In some examples whether public or private the RTP's place, name, geographic address, ownership, any charges due for use, usage logging, and other identifying and connection information may be recorded by a Teleportal Index/Search Server (TPI/SS) 355 or by other TP applications 355 that provides means for a viewer 390 of a LTP 370 to find and connect with an RTP 420 322. In some examples said TPI/SS 355, TPAS 350, or TPSS 350 may each be located on a separate server(s) 355 or in some examples run on any Teleportal Server 345 350 355.

In some examples the LTP 370 has a dedicated controller 380 whose interface includes buttons and/or visual interface means designed to run an LTP that may be displayed on a screen or controlled by a user's gestures or voice or other means. In some examples the LTP 370 has a "universal remote control" 380 of multiple electronics whose interface fits a range of electronics. In some examples a variety of on-screen controls, images, controls, menus, or information can be displayed on the Local Teleportal to provide means for control or navigation 400 405. In some examples means provide access to groups, lists or a variety of small images of other places (which include IPTR [Identities/people, Places, Tools, Resources) directly available 400 405. In some examples the LTP 370 displays one or a plurality of currently open Shared Planetary Life Space(s) 400'405. In some examples the LTP 370 displays a digital window style such as overlaying a double-hung window 410 over the RTP place 310 315 320 325. In some examples the LTP 370 simultaneously displays other information or images (which include people, places, tools, resources, etc.) on the LTP 370 such as described in FIGS. 91, 92 and elsewhere.

In some examples an LTP 430 may not be available and an Alternate Input Device/Alternate Output Device (AID/AOD) 432 434 436 438 running a Virtual Teleportal (VTP) may be employed instead. In some examples an AID/AOD may be a mobile phone 432 or a "smart" phone 432. In some examples an AID/AOD may be a television set-top box 436 or a "smart" networked television 436. In some examples an AID/AOD may be a PC or laptop 438. In some examples an AID/AOD may be a wearable computing device 438. In some examples an AID/AOD may be a mobile computing device 438. In some examples an AID/AOD may be a communications-enabled DVR 436. In some examples an AID/AOD may be a computing device such as a netbook, tablet or a pad 438. In some examples an AID/AOD may be an online game system 434. In some examples an AID/AOD may be an appropriately capable Device In Use such as a networked digital camera, or surveillance camera 432. In some examples an AID/AOD may be an appropriately capable digital device such as an online sensor 432. In some examples an AID/AOD may be an appropriately capable web application 438, website 438, web widget 438, servlet 438, etc. In some examples an AID/AOD may be an appropriately capable application 438 or API that calls code that provides these functions 438. Since these do not have a Human Position Sensor 365 or a Communication/Processing Module 360 these do not automatically alter the view of the remote scene 310 in response to changes in the viewer's location. Therefore in some examples AIDs/AODs, utilize a default view, while in some examples AIDs/AODs, utilize manual means to alter the view displayed.

In some examples two or a plurality of LTP's 430 and AIDs/AODs provide TP Shared Planetary Life Spaces (SPLS) directly and with VTP's. This may be enabled if two or a plurality of Teleportals 430 or AIDs/AODs 432 434 436 438 are configured with a camera 377 and microphone 377 and the CPM 360 or VTP includes appropriate processing, memory and software so that it can provide said SPLS. When embodied and configured in this manner, both LTP's 430 and AIDs/AODs 432 434 436 438 can serve as a devices that provide Teleportal Shared Space(s) between two or a plurality of LTPs and AIDs/AODs 432 434 436 438.

LTP devices physical examples: Some examples in FIGS. 19 through 25, along with some examples in FIGS. 91 through 95 and elsewhere, illuminate and further describe some extensible Teleportal (TP) devices examples included herein. Turning now to some examples, TP devices may be built in a wide variety of devices, designs, models, styles, sizes, etc.

Figure 19:
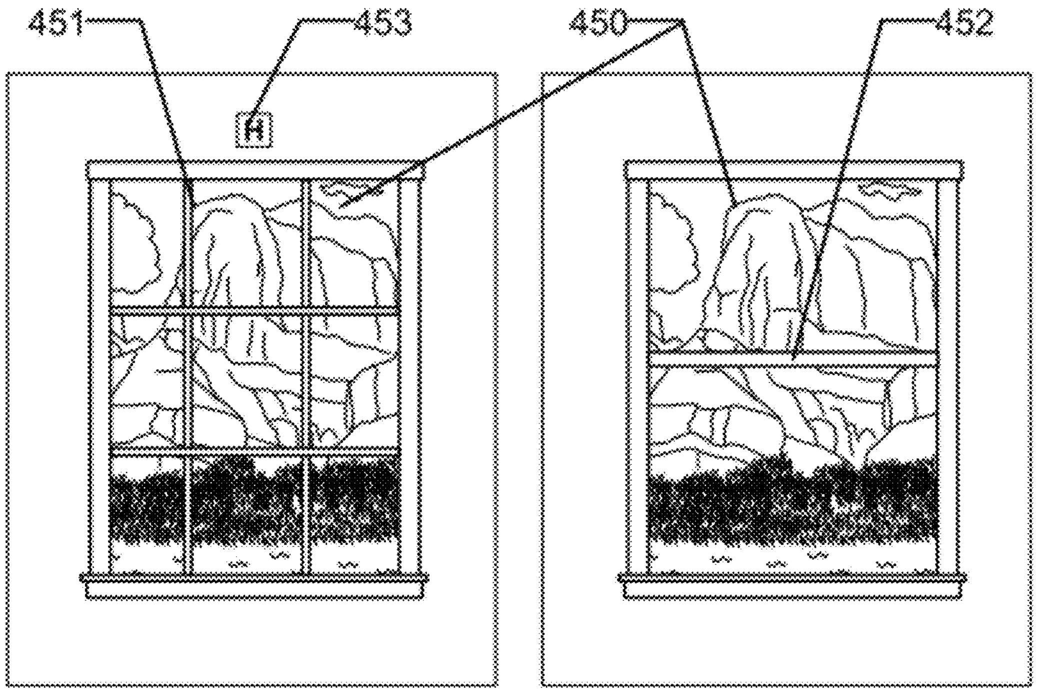
FIGS. 19 through 25 are pictorial diagrams that illustrate some styles for Local Teleportal devices including windows, wall pockets, shapes, frames, multiple integrated Teleportals, and Teleportal walls.

LTP "window" styles, audio and dynamic positioning: In some examples a single Local Teleportal (LTP) 451 in FIG. 19 shows that a Teleportal may be designed based on an underlying reconceptualization of a glass window the Window as a digital device that is a portal into "always on" Shared Planetary Life Spaces (SPLS), constructed digital realities, digital presence "events", and other digital realities (as described elsewhere)—in this example the LTP has opened an SPLS that includes a connection to a view 450 that inside the Grand Canyon on the summer afternoon when this LTP is being viewed, with that view expanded to the entire LTP display—as if it were a real window looking out inside the Grand Canyon on that day. Because an LTP's display is a component of a digital device, in some examples the decorative window frame 451 452 may be digitally overlaid as an image over the SPLS connection 450. In some examples the decorative window frame's style, color, texture, material, etc. (in some examples wood, in some examples metal, in some examples composites, etc.) to create the appearance of different types of windows that provide presence at this remote place 450. In the examples in FIG. 19 two window styles are shown, a casement window style 451 and a double-hung window style 452. In each example an LTP may include audio. Since in this example the window like display components (eg, the frame and internal window styles) 451 452 are a digital image that is overlaid on the SPLS place, these can be varied at a command from the viewer to show this example LTP window as partially open, or completely open. The audio's volume can be raised or lowered automatically and proportionately as the window is digitally "opened" or "closed" to reflect the audio volume changes that would occur as if this were a real local glass window with that SPLS place actually outside of it. Another LTP component in some examples is illustrated in FIG. 19, an optional Superior Viewer Sensor (herein SVS, as described elsewhere) 453 that may be used to automatically adjust the view of a focused connection place in response to changes in the position of the viewer(s), so that this digital "window view" behaves in the same way as a real window's view changes as a viewer moves in juxtaposition to it—which may increase the feeling of presence in some examples with SPLS people, in some examples with SPLS places, etc.

Figure 20:
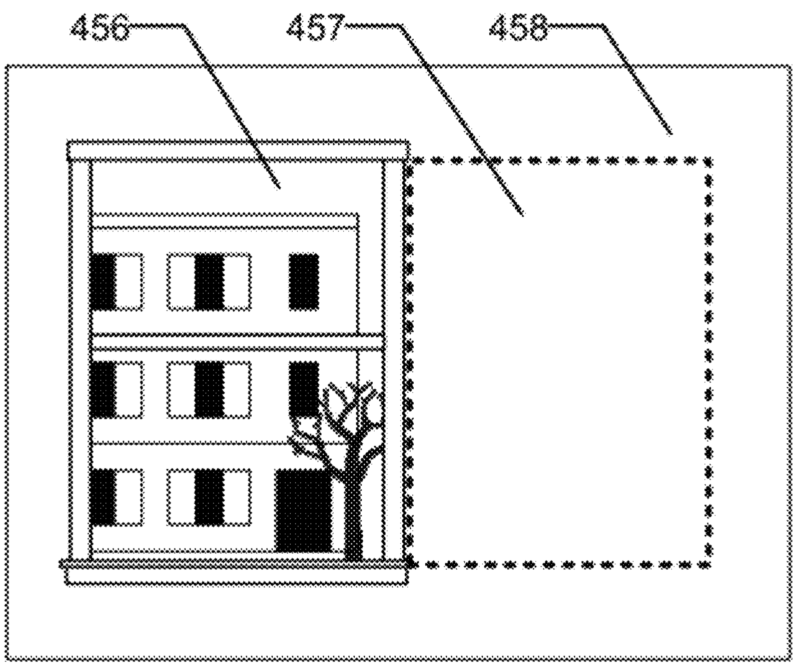
Figure 21:
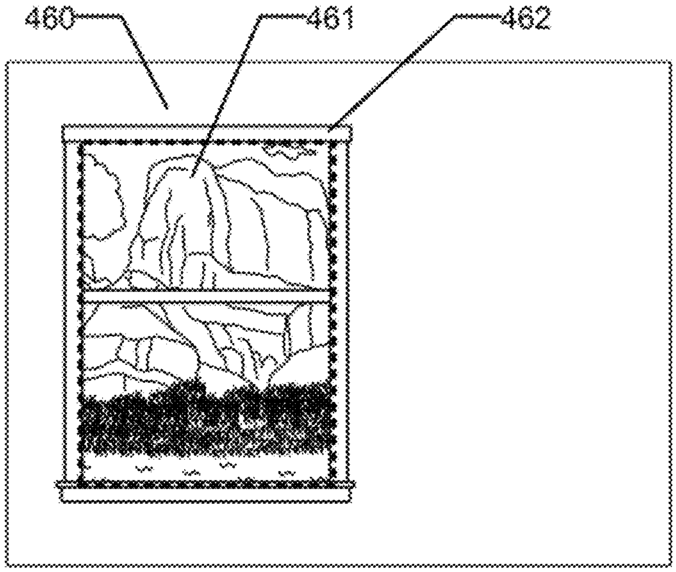

Hide or show LTP over a local window, using a wall pocket: In some examples FIGS. 20 and 21 show the combination of a Local Teleportal 457 461 with a local glass window 456 by means of a wall pocket 458. In some examples a traditional local glass window 456 may have a "pocket door" space in the wall 458 along with a mechanical motor and a track that slides the LTP 457 461 in and out from the pocket in the wall 458. In this example the local glass window view 456 is on the third floor of an apartment in the northern USA during a winter day, with the local glass window 456 visible and the LTP 457 hidden in the pocket in the wall 458 by mechanically sliding it into this pocket (as shown by the dotted line 458). In some examples, as illustrated in FIG. 21, the single Local Teleportal (LTP) 461 is mechanically slid out from its wall pocket to cover the local glass window 460 with the LTP showing a TP connection to an SPLS place 461 that replaces the local glass window's view of the apartment building. This SPLS place 461 is inside the Grand Canyon during winter. In some examples the local glass window 460 is covered by the LTP 462 with an SPLS place visible 461. The dotted line 462 shows where the LTP is moved over the local glass window's view of an apartment building 456, whose local view was visible in a prior figure.

Figure 22:
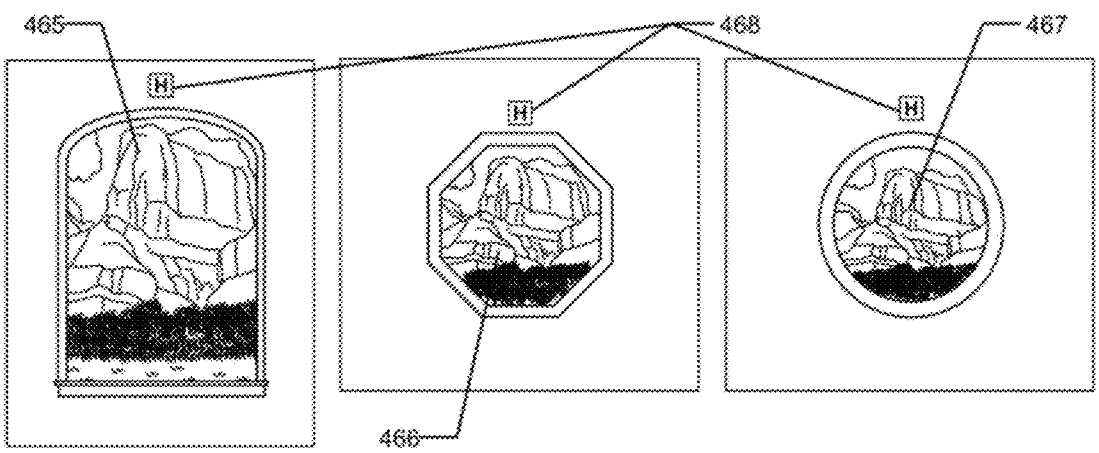

Multiple shapes for Teleportals: In some examples various shapes and styles may be employed for Teleportals, and some examples are illustrated in FIG. 22 which shows an SPLS place 450 inside the Grand Canyon during summer. In some examples local glass windows with various sizes and shapes can have a Local Teleportal (LTP) installed such as an arch shaped LTP 465 in some examples, an octagon shaped LTP 466 in some examples, and a circular shaped LTP 467 in some examples. Each of these example shapes, and other examples of shaped LTPs, may by accomplished by means such as (1) in some examples permanently mounting an LTP in a shaped local window 465 466 467, (2) in some examples permanently mounting an LTP in front of a shaped local window 465 466 467, (3) in some examples sliding a LTP in and out of a wall pocket 465 466 467 to use or not use the local window by means of a wall pocket and a mechanical motor and track, as illustrated in FIGS. 20 and 21. To display an SPLS place appropriately in a shaped LTP of varying size and shape, in some examples automated controls set an appropriate amount of zooming out or magnification in of the SPLS place. and/or manual controls. To display an SPLS place appropriately in a shaped LTP of varying size and shape, in some examples manual controls may be used to set an appropriate amount of zooming out or magnification in of the SPLS place. These examples are illustrated in FIG. 22 with the arch window slightly magnified 465, and the circular window is slightly zoomed out 467. Also in FIG. 22 the rectangular "H" above each of these three examples of differently shaped LTPs 468 represents an optional Superior Viewer Sensor (SVS) that adjusts the view in each LTP to match the position(s) of the viewer(s).

Figure 23:
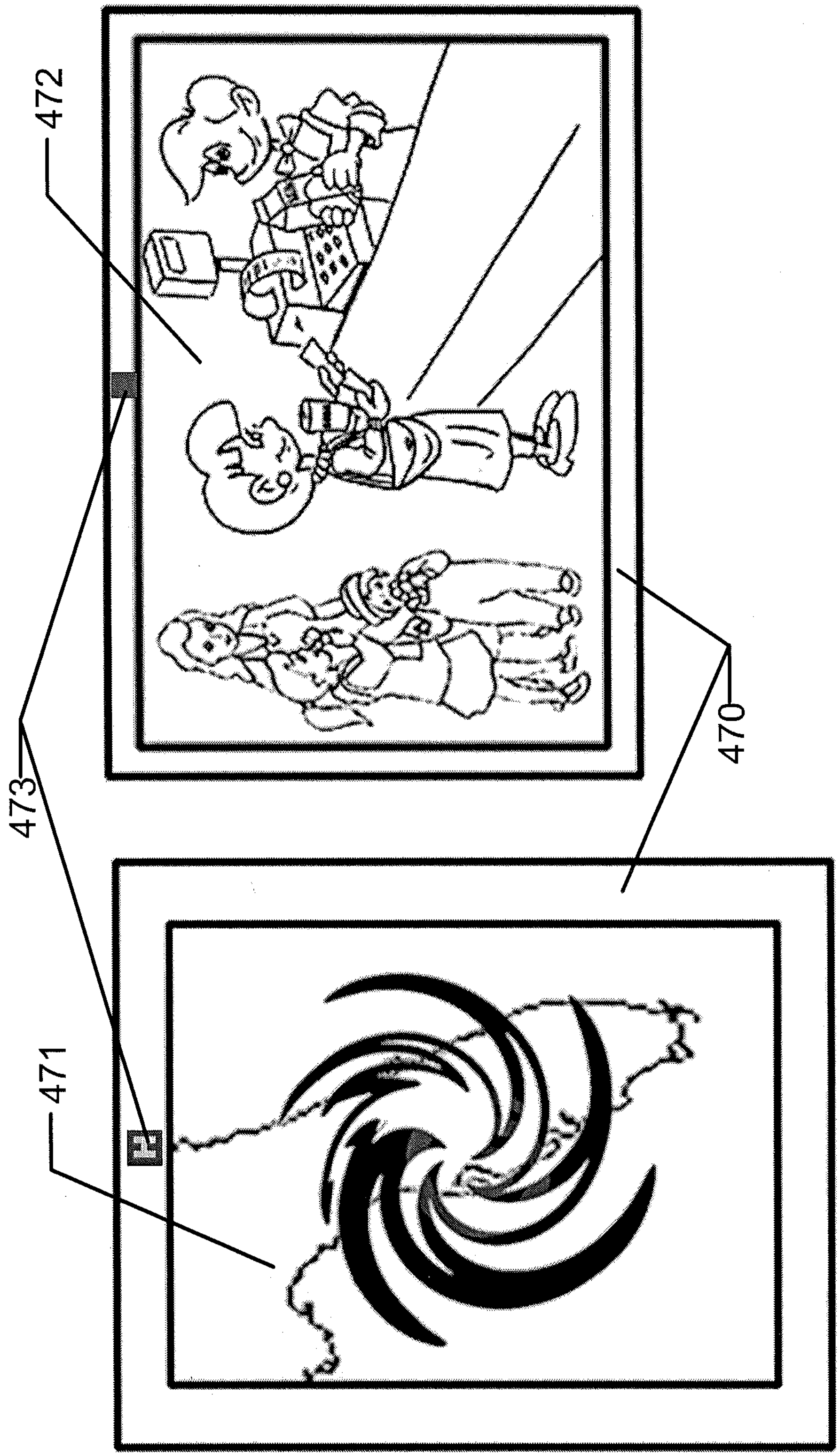

Local Teleportals in portable frames: In some examples the display(s) of a single Local Teleportal or a plurality of Local Teleportals 471 472 may be in a portable frame(s) 470, which in turn may be hung on a wall, placed on a stand, stood on a desk, or put in any desired location. As illustrated elsewhere, said outside "frame" 470 may be a digital border and/or decoration rather than part of the physical frame, while in some examples it may be an actual physical frame 470. If said outside frame 470 is digital, then various frame designs and colors may be stored and changed at will by means of local or remote processing, or retrieved on demand to provide a wider range of designs and colors, whether these look like traditional frames or are artistically creative digital alterations such as "torn edges" on the images displayed. In some examples an LTP that is in a portable frame may be in various sizes and orientations (in some examples portrait 471 or landscape 472, in some examples small or large, in some examples vertical or horizontal, in a larger example single or multiple views on one LTP, etc.) to fit each viewers' criteria in some examples, budget in some examples, available space in some examples, subject choices in some examples, etc. Because an LTP is a digital device that is a portal into "always on" Shared Planetary Life Spaces (SPLS), the LTP's in FIG. 23 show an example SPLS focused connection with a weather satellite that is located over a hurricane crossing Florida 471—as if the viewer were in space looking out on that scene. In some examples LTPs in portable frames may be used to observe a chain of retail stores, and a single LTP 472 is observing a franchisee's ice cream store from an SPLS that includes all of that chain's retail ice cream locations. Also in some examples one SPLS place may be expanded to fill the entire LTP display, as in these examples 471 472. Also in this figure, the rectangular "H" in the top of each of these two examples of framed LTPs 473 represents an optional Superior Viewer Sensor (SVS) that adjusts the view in each LTP to match the position(s) of the viewer(s).

Figure 24:
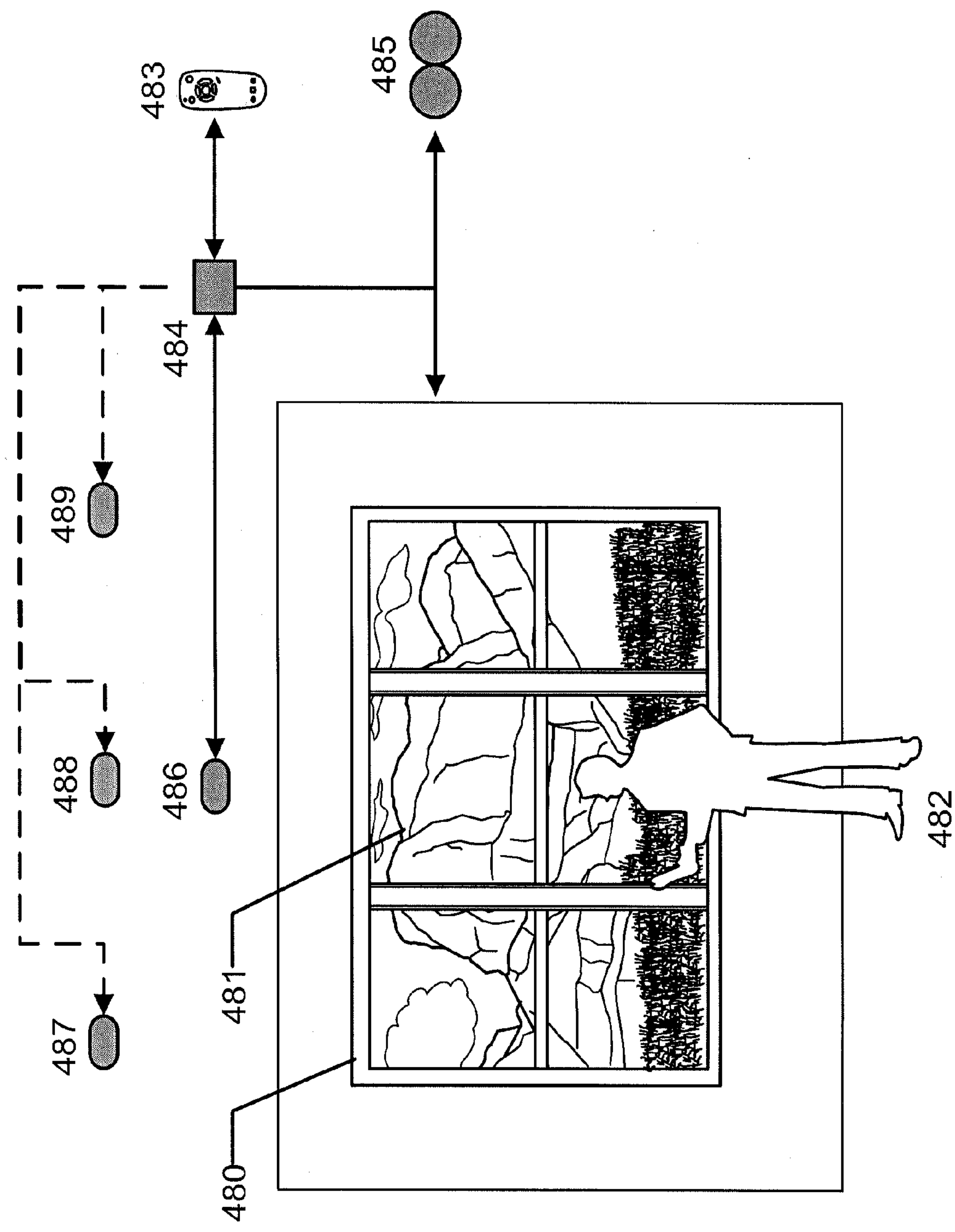

Multiple Teleportals integrated into a single view: In some examples the displays of two or a plurality of Teleportals may be combined into one larger display. One example of this is illustrated in FIG. 24 which shows said integration in a manner that simulates the broad outside view that is observed from adjacent multiple local glass windows. In some examples the plurality of Teleportals may be touching to provide one panoramic view 481. In some examples the plurality of Teleportals may be slightly separated from each other as with some local glass window styles. Regardless of the physical shape(s) or style(s) of the said integrated Teleportals, together they may display one appropriately combined view 481, which in this example is from an SPLS place inside the Grand Canyon on that summer day, with that view expanded to the integrated LTP display—as if it were a real window present at that place on that day. In some examples the Teleportal's SPLS place and the full Teleportal display is chosen by a single viewer 482 using a handheld wireless remote control 483. In some examples the window perspective displayed is determined by a single Superior Viewer Sensor (SVS) 486 by means of algorithms calculated by one or a plurality of processors 484. In some examples the window perspective displayed is determined by a plurality of Superior Viewer Sensors (SVS) 487 488 489 by means of algorithms calculated by one or a plurality of processors 484. The local sounds in the Grand Canyon are played over the Teleportal's audio speaker(s) 485. In some examples the window style of the Teleportal 480 may be physical. In some examples the window style of the Teleportal 480 may be digitally displayed from multiple stored styles and overlaid over the SPLS place 481.

Figure 25:
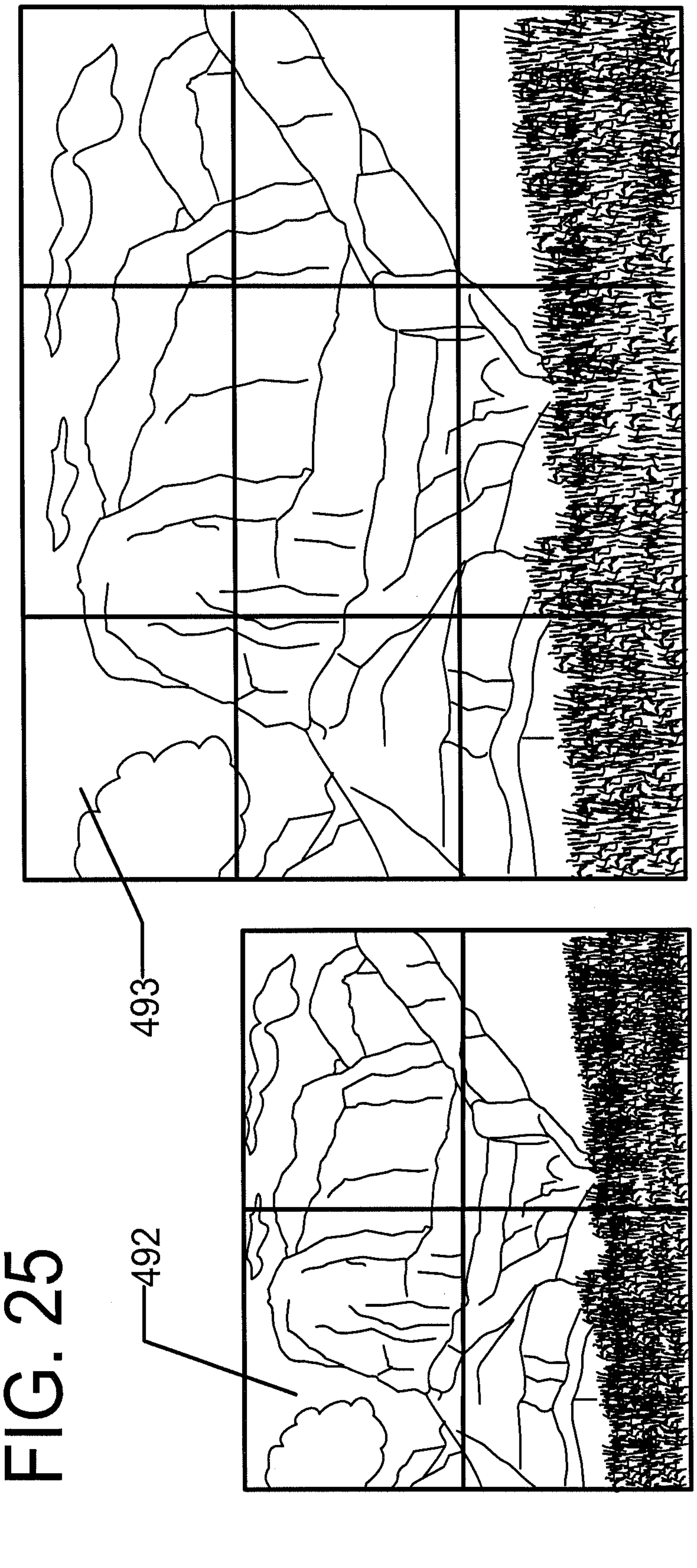

Larger integrated Teleportals/Teleportal Walls: In some examples known video wall technology may be applied so that multiple broader or taller Teleportals may span larger areas of a wall(s), room(s), stage(s), hall(s), billboard(s), etc. FIG. 25 illustrates some examples of larger integrated Teleportal Walls such as in some examples a 2-by-2 Teleportal 492, and in some examples a 3-by-3 Teleportal 493. The integration of multiple Teleportals into one "Teleportal Wall" is done by the processor(s) and software 484 in FIG. 24. Whether or not there should be one SVS (Superior Viewer Sensor) 486 or a plurality of SVS's 487 488 489 depends on the location of the Teleportal Wall 492 493: In some examples it may be in heavily trafficked public areas with moving viewers, in some examples sports bars whose SPLS's are located inside of football stadiums, baseball stadiums, and basketball arenas; in which cases these might not include a SVS. In some examples a Teleportal Wall 492 493 may be in a more one-on-one location which in some examples a family room and in some examples is a business office or cublicle;

there one or a plurality of SVS(s) may be utilized to provide appropriate changes in the Teleportal Wall scene(s) displayed in response to the viewer(s) position(s). Alternatively, in some examples a projected LTP display may be utilized instead of a LTP wall, in which case the LTP's display size may be large and varying based on the viewers' needs or preferences, and the projection size may also be determined by the features and capabilities of the projection display device; similarly also, in some examples one or a plurality of SVS may be utilized with a projected LTP display.

MTP devices physical examples: Mobile Teleportals (MTPs) may be constructed in various styles, and some examples are illustrated in FIG. 26, "Some MTP (Mobile Teleportal) Styles," which are based on a common factoring of digital devices into Teleportals with new features such as "always on" Shared Planetary Life Spaces (SPLS). Because each MTP utilizes the same technologies as other Teleportal devices but implements them in a variety of form factors and assemblages of hardware and software components, said MTP's provide parallel features and functionality to other Teleportal devices. Since each form factor continuously integrates processors that become faster and more powerful, more memory, higher bandwidth communications, etc., these MTP styles exemplify an evolving continuum of Teleportal capabilities. Iri the examples in FIG. 26 three mobile phone styles 501 are illustrated including a full-screen design 501 that operates by means of a touch screen and a single physical button at the bottom, a flip-open design 501 such as a Star Trek communicator, and a full-button design 501 that includes a keyboard with a trackball and function keys. In each example audio input and output parallels a mobile phone's microphone and speaker, including a speakerphone function for audio communications while viewing the screen. Alternately, audio input/output may be provided by wireless means such as a Bluetooth earpiece or headset, or by wired means such as a hands-free microphone/earpiece or headset. In each mobile phone-like design an optional Superior Viewer Sensor (herein SVS, as described elsewhere) 502 is located on an MTP (such as at its top in each of these examples), and the SVS may be used to automatically adjust the view of a focused connection place in response to changes in the position of a viewer.

In the examples in FIG. 26 three tablet and pad styles 504 are illustrated including a small pad design 504 that has multiple physical buttons and a trackball, a medium-sized tablet design 504 that has a stylus and a physical button, and a medium to large pad design 504 that operates by means of a touchscreen and a single physical button. In each example audio input and output parallels a mobile phone's microphone and speaker, including a speakerphone function for audio communications while viewing the screen. Alternately, audio input/output may be provided by wireless means such as a Bluetooth earpiece(s) or headset(s), or by wired means such as a hands-free microphone/earpiece or headset. In each tablet-like and pad-like design an optional Superior Viewer Sensor (herein SVS, as described elsewhere) 505 is located on an MTP (such as at its top in each of these examples), and the SVS may be used to automatically adjust the view of a focused connection place in response to changes in the position of a viewer.

In the examples in FIG. 26 two portable communicator styles 504 are illustrated including a wireless communicator 507 that has multiple buttons like a mobile phone, with audio input and output that parallels a mobile phone's microphone and speaker, including a speakerphone function for viewing the screen while communicating; or, alternatively, a base-station with a built-in speakerphone; or, alternatively, a wireless Bluetooth earpiece or headset. In this type of design an optional Superior Viewer Sensor (herein SVS, as described elsewhere) 502 is located at the top of this communicator's handset, and the SVS may be used to automatically adjust the view of a focused connection place in response to changes in the position of a viewer. Another example of a portable communicator style is an eyeglasses design 508 that includes a visual display with audio output through speakers next to the ears and audio input through a hands-free microphone. In this type of design an optional Superior Viewer Sensor (herein SVS, as described elsewhere) 502 is located to one side or both sides of said visual display and use eye tracking to automatically adjust the view of a focused connection place in response to changes in the directional gaze of a viewer.

In the examples in FIG. 26 two netbook and laptop styles 510 are illustrated including the equivalents of a full-featured laptop and a full-featured netbook that are, however, designed as Mobile Teleportals. In each example audio input and output parallels a netbook's or laptop's microphone and speaker for audio communications while viewing the screen. Alternately, audio input/output may be provided by wireless means such as a Bluetooth earpiece or headset, or by wired means such as a microphone or headset. In each netbook-like and laptop-like design an optional Superior Viewer Sensor (herein SVS, as described elsewhere) 505 is located on an MTP (such as at its top in each of these examples), and the SVS may be used to automatically adjust the view of a focused connection place in response to changes in the position of a viewer.

In the examples in FIG. 26 one portable projector style 514 is illustrated including a portable base unit 515 which provides Teleportal functionality and may be connected by cable or wirelessly with said projector 514 (or, alternatively, said projector and base station may be combined within one portable case). In said example portable projector's visual image 516 is displayed on a screen 516, a wall 516, a desktop 516, a whiteboard 516, or any desired and appropriate surface 516. In a portable projector audio input and output are provided by a microphone 518 and a speaker 518, including a speakerphone function for viewing the projected image 516 while communicating from a location(s) next to or near the projector. Alternately, audio input/output may be provided by means such as a wireless Bluetooth earpiece 518 or headset 518, or a wired microphone or hands-free microphone/earpiece. In each portable projector-like design an optional Superior Viewer Sensor (herein SVS, as described elsewhere) 517 is located on an MTP (such as at its top in this example), and the SVS may be used to automatically adjust the view of a projected connection place in response to changes in the position of a viewer.

RTP devices physical examples: Turning now to FIG. 27, "Fixed RTP (Remote Teleportal)," in some examples an RTP 2004 (as described elsewhere in more detail) is a networked and remotely controlled TP device that is a fixed RTP device 2004 that may operate on land 2011, in the water 2011, in the air 2011, or in space 2011. In some examples said the RTP 2004 is functionally equivalent to an LTP 2001 (including in some examples hardware, software, architecture, components, systems, applications, etc. as described elsewhere) or an MTP 2001 (as described elsewhere) but may have one or a plurality of additional sensors, an alternate power source(s), one or a plurality of (optional) means for mobility, communicate by means of any of a plurality of networks, and be controlled remotely over one or a plurality of networks 2005 with a controlling device(s) such as an LTP 2001, an MTP 2001, a TP subsidiary device 2002, an AID/AOD 2003 or by another type of networked electronic device. Alternatively, an RTP 2004 (as described elsewhere) may contain a subset of an LTP's functionality and have said subset controlled remotely in the same manner. Alternatively, an RTP 2004 (as described elsewhere) may contain a superset of an LTP's functionality by including additional types of sensors, means for mobility, etc. In addition, in some examples an RTP's 2004 remote control includes the operation of the device itself, its sensors, software means to process said sensors' input, recording means to store said sensors' data, networking means to transmit said sensors' raw data, networking means to transmit said sensors' processed data, etc. The illustrations in FIGS. 27 and 28 are therefore examples of RTP devices 2004 connected to one or a plurality of networks 2005 that utilize choices of devices, hardware, sensors, software, communications, mobility, servers, operating systems, networks, and other components that employ features and capabilities to each fit a particular configuration and set of desired features, and may be modified as needed to fit a plurality of purposes.

In some examples 2010 a Remote Teleportal (herein RTP) is fixed in a specific physical location, place, etc. and may also have a fixed orientation and direction so that it provides observation, data collection, recording, processing, and (optional) two-way communications in a preset fixed place or domain; or alternatively a fixed RTP may include remote controlled PTZ (Pan, Tilt, Zoom) so that the orientation and/or direction of said RTP (or of one of its components such as a camera or other sensor) may be controlled and directed remotely.

Said remote control of said fixed RTP 2004 2010 includes sending control signal(s) from one or a plurality of controlling devices 2001 2002 2003, receiving said control signal(s) by said RTP 2004 2015, processing said received control signal(s) by said RTP 2004 2015, then controlling the appropriate RTP function(s) 2004 2013 2014 2015 2016, component(s) 2004 2013, sensor(s) 2004 2013, communications 2004 2016, etc. of said RTP device 2004. In some examples said control signals are selectively transmitted 2001 2002 2003 to the RTP device 2004 where they are received and processed in order to control said RTP device 2004 which in some examples controls functions such as turning said device on or off 2004 2014, in some examples puts said device in or out of standby or suspend mode 2004 2014 (such as powering down a solar powered RTP from dusk until dawn), in some examples turning on or off one or a plurality of sensors 2004 2013 (such as in some examples using a camera for video observation 2004 2013, in some examples using only a microphone for listening 2004 2013, in some examples using weather sensors to determine local conditions 2004 2013, in some examples using infrared night vision (herein IR) 2004 2013 for nighttime observation, in some examples triggering some sensors or functions automatically such as with a motion detector 2004 2013, in some examples setting alerts 2004 2013 such as by specific sounds, specific identities, etc. In some examples said control signals are received and processed 2004 in order to control one or a plurality of simultaneous RTP processes such as constructing one or a plurality of digital realities (as described elsewhere) in real-time while transmitting said digital realities in one or a plurality of separate streams 2016. In some examples an RTP 2004 may be shared and the remote user(s) 2001 2002 2003 who are sharing said RTP device 2004 provide separate user control of separate RTP processing or functions, such as in some examples creating and controlling a separate digital reality (ies).

In the following fixed RTP examples various individual components, and combinations of components, are known and will not be described in detail herein. In some examples fixed RTP's 2004 are comprised of a land-based RTP device 2011 in a location such as Times Square, New York 2012; with sensors in some examples such as day and night cameras 2013 and microphones 2013; with power sources such as A/C 2014, solar 2014, and battery 2014; with remote control 2001 2002 2003 of the RTP device 2015 including control of processing 2015 and applications 2015 (such as digital realities construction); and with communications such as WiFi 2016, wired network 2016, WiMAX 2016; and with optional two-way video communications by means such as an LCD screen and a speaker. In some examples fixed RTP's 2004 are comprised of a land-based RTP device 2011 in a nature location such as an Everglades bird rookery 2012; with sensors in some examples such as day and night cameras 2013, microphones 2013, motion detectors 2013, GPS 2013, and weather sensors 2013; with power sources such as solar 2014, and battery 2014; with remote control 2001 2002 2003 of the RTP device 2015 including control of processing 2015 and applications 2015 (such as digital realities construction); and with communications such as satellite 2016, WiMAX 2016, cellular radio 2016, etc. In some examples fixed RTP's 2004 are comprised of a land-based RTP device 2011 in a location such any public or private RTP installation 2012; with sensors in some examples such as day and night cameras 2013, microphones 2013, motion detectors 2013, etc.; with power sources such as A/C 2014, solar 2014, and battery 2014; with remote control 2001 2002 2003 of the RTP device 2015 including control of processing 2015 and applications 2015 (such as digital realities construction); and with communications such as WiFi 2016, wired network 2016, WiMAX 2016, satellite 2016, cellular radio 2016; and with optional two-way video communications by means such as an LCD screen and a speaker.

In some examples fixed RTP's 2004 are comprised of a water-based RTP device 2011 in a location such as submerged on a shallow coral reef 2012; with sensors in some examples such as a camera 2013, microphone 2013, motion detector 2013, etc.; with power sources such as an above water solar panel 2014 (fixed on a permanent structure or floating on a substantial anchored buoy) and battery 2014; with remote control 2001 2002 2003 of the RTP device 2015 including control of processing 2015 and applications 2015 (such as digital realities construction); and with communications such as satellite 2016, cellular radio 2016, etc. In some examples fixed RTP's 2004 are comprised of a water-based RTP device 2011 in a water location such as tropical waterfall 2012, reef 2012 or other water feature 2012 as determined by a tropical resort hotel; with sensors in some examples such as a camera 2013, microphone 2013, motion detector 2013, GPS 2013, weather sensors 2013, infrared night camera 2013, etc.; with power sources such as A/C 2014, solar 2014, and battery 2014; with remote control 2001 2002 2003 of the RTP device 2015 including control of processing 2015 and applications 2015 (such as digital realities construction); and with communications such as WiFi 2016, WiMAX 2016, satellite 2016, cellular radio 2016, etc.

In some examples fixed RTP's 2004 are comprised of an arial-based RTP device 2011 in a location such as a penthouse balcony overlooking Central Park in New York City 2012; with sensors in some examples such as a camera 2013, microphone 2013, motion detector 2013, GPS 2013, weather sensors 2013, infrared night camera 2013, etc.; with a power sources such as A/C 2014; with remote control 2001 2002 2003 of the RTP device 2015 including control of processing 2015 and applications 2015 (such as digital realities construction); and with communications such as WiFi 2016 or wired networking 2016; etc. In some examples fixed RTP's 2004 are comprised of an arial-based RTP device 2011 in a location such as mounted on a tree trunk along the bank of the Amazon River in Brazil 2012, the Congo River in Africa 2012, or the busy Ganges in India 2012; with sensors in some examples such as a camera 2013, microphone 2013, motion detector 2013, GPS 2013, weather sensors 2013, night camera 2013, etc.; with power sources such as a mounted solar panel 2014 and battery 2014; with remote control 2001 2002 2003 of the RTP device 2015 including control of processing 2015 and applications 2015 (such as digital realities construction); and with communications such as WiFi 2016, WiMAX 2016, satellite 2016, cellular radio 2016, etc. In some examples fixed RTP's 2004 are comprised of an arial-based RTP device 2011 in a location such as a tower or weather balloon over a landmark or attraction 2012 such as a light tower over a sports stadium 2012, a weather balloon over a golf course during a PGA tournament 2012, a lighthouse over the rocky Maine shoreline 2012; with sensors in some examples such as a camera 2013, microphone 2013, motion detector 2013, GPS 2013, weather sensors 2013, infrared night camera 2013, etc.; with a power sources such as A/C 2014, solar 2014, battery 2014, etc.; with remote control 2001 2002 2003 of the RTP device 2015 including control of processing 2015 and applications 2015 (such as digital realities construction); and with communications such as WiFi 2016, WiMAX 2016, satellite 2016, cellular radio 2016, etc.

In some examples a fixed RTP's 2004 may be comprised of a space-based RTP device 2011 in a location such as aboard a geosynchronous weather satellite over a fixed location on the Earth 2012; with sensors in some examples such as a camera 2013, infrared night camera 2013, etc.; with a power sources such as solar 2014, battery 2014, etc.; with remote control 2001 2002 2003 of the RTP device 2015 including control of processing 2015 and applications 2015 (such as digital realities construction); and with communications such as satellite 2016, radio 2016, etc.

Turning now to FIG. 28, "Mobile RTP (Remote Teleportal)," in some examples an RTP 2024 (as described elsewhere) is a mobile and remotely controlled RTP device 2024 that may operate on the ground 2031, in the ocean 2031 or in another body of water 2031, in the sky 2031, or in space 2031. In some examples 2030 a mobile RTP has a remotely controllable orientation and direction so that it provides observation, data collection, recording, processing, and (optional) two-way communications in any part(s) of the zone or domain that it is directed to occupy and/or observe by means of its mobility.

Said remote control of said mobile RTP 2024 2030 includes sending control signal(s) from one or a plurality of controlling devices 2021 2022 2023, receiving said control signal(s) by said RTP 2024 2035, processing said received control signal(s) by said RTP 2024 2035, then controlling the appropriate RTP function 2024 2032 2033 2034 2035 2036, component 2024 2033, sensor 2024 2033, mobility 2024 2032, communications 2024 2036, etc. of said RTP device 2024. In some examples the remote control of said mobile RTP operates as described elsewhere, such as controlling one or a plurality of simultaneous RTP processes such as constructing one or a plurality of digital realities (as described elsewhere) in real-time while transmitting said digital realities in one or a plurality of separate streams 2036. In some examples a mobile RTP 2024 may be shared and the remote user(s) 2021 2022 2023 who are sharing said RTP device 2024 provide separate user control of separate RTP processing or functions, such as in some examples creating and controlling a separate digital reality(ies).

In the following mobile RTP examples various individual components, and combinations of components, are known and will not be described in detail herein. In some examples mobile RTP's 2024 are comprised of a ground-based mobile RTP device 2031 such as a remotely controlled telepresence robot on wheels 2032 in a location such as a company's offices 2032; with sensors in some examples such as one or a plurality of cameras 2033, speakers 2033 and microphones 2033; with power sources such as A/C 2034, solar 2034, and battery 2034; with mobility such as wheels for going to numerous locations throughout the offices 2032, wheels for accompanying people who are walking 2032, swivels for turning to face in different directions 2032, raising or lowering heights for communicating eye-to-eye 2032; with remote control 2021 2022 2023 of the mobile RTP device 2024 including control of processing 2035 and applications 2035 (such as digital realities construction); and with communications such as WiFi 2036, wired network 2036, WiMAX 2036; and with optional two-way video communications by means such as an LCD screen and a speaker. In some examples mobile RTP's 2024 are comprised of a ground-based mobile RTP device 2031 such as a remotely controlled vehicle mounted RTP 2032 in a location such as a company's trucks 2032, construction equipment 2032, golf carts 2032, forklift warehouse trucks 2032, etc.; with sensors in some examples such as one or a plurality of cameras 2033, speakers 2033, microphones 2033, GPS 2033, motion detectors 2033, infrared night cameras 2033, weather sensors 2033, etc.; with power sources such as said vehicle's electric power 2034, solar 2034, and battery 2034; with mobility such as said vehicle's mobility 2032 so that said vehicle(s) have tracking, observation, optional real-time communication, etc.; with remote control 2021 2022 2023 of the mobile RTP device 2024 including control of processing 2035 and applications 2035 (such as digital realities construction); and with communications such as WiFi 2036, WiMAX 2036, cellular radio 2036, satellite 2036, etc.; and with optional two-way video communications by means such as an LCD screen and a speaker. In some examples mobile RTP's 2024 are comprised of a ground-based mobile RTP device 2031 such as a remotely controlled personal RTP 2032 that is worn by an individual; with sensors in some examples such as one or a plurality of cameras 2033, speakers 2033, microphones 2033, GPS 2033, motion detectors 2033, infrared night cameras 2033, weather sensors 2033, etc.; with power sources such as solar 2034, battery 2034, A/C 2034; with mobility such as said individual's mobility 2032 so that said individual carries RTP tracking, observation, real-time communication, etc.; with remote control 2021 2022 2023 of the personal mobile RTP device 2024 including remote control of processing 2035 and applications 2035 (such as digital realities construction); and with communications such as WiFi 2036, WiMAX 2036, cellular radio 2036, satellite 2036, LAN port 2036, etc.; and with optional two-way video communications by means such as a speaker and an LCD screen or a projector.

In some examples mobile RTP's 2024 are comprised of an ocean-based mobile RTP device 2031 such as a remotely controlled ship or boat mounted RTP 2032 in one or more locations aboard a ship 2032; with sensors in some examples such as one or a plurality of cameras 2033, speakers 2033, microphones 2033, GPS 2033, motion detectors 2033, infrared night cameras 2033, weather sensors 2033, etc.; with power sources such as said vessel's electric power 2034, solar 2034, and battery 2034; with mobility such as said vessel's mobility 2032 so that said vessel has RTP tracking, observation, optional real-time communication, etc.; with remote control 2021 2022 2023 of the mobile RTP device 2024 including control of processing 2035 and applications 2035 (such as digital realities construction); and with communications such as WiFi 2036, WiMAX 2036, cellular radio 2036, satellite 2036, etc.; and with optional two-way video communications by means such as an LCD screen and a speaker. In some examples mobile RTP's 2024 are comprised of an ocean-based mobile RTP device 2031 such as a remotely controlled submarine (or underwater glider) mounted RTP 2032; with sensors in some examples such as one or a plurality of cameras 2033, microphones 2033, GPS 2033, motion detectors 2033, infrared night cameras 2033, weather sensors 2033, etc.; with power sources such as said submarine's electric power 2034, occasional solar solar 2034 (when surfaced), and battery 2034; with mobility such as said submarine's mobility 2032 so that said submarine has RTP tracking, observation, sensor data collection, etc.; with remote control 2021 2022 2023 of the mobile RTP device 2024 including control of processing 2035 and applications 2035 (such as digital realities construction); and with communications such as WiFi 2036, WiMAX 2036, cellular radio 2036, satellite 2036, etc.

In some examples mobile RTP's 2024 are comprised of an sky-based mobile RTP device 2031 such as a remotely controlled balloon or aircraft mounted RTP 2032 in one or more locations below a balloon 2032, or mounted in or on an aircraft 2032 (such as a radio controlled plane, a UAV, a drone, a radio controlled helicopter, etc.); with sensors in some examples such as one or a plurality of cameras 2033, microphones 2033, GPS 2033, motion detectors 2033, infrared night cameras 2033, weather sensors 2033, etc.; with power sources such as said balloon's equipment's or aircraft's battery or electric power 2034; with mobility such as said balloon's mobility 2032 or said aircraft's mobility 2032 so that said conveyance has mobile RTP tracking, observation, etc.; with remote control 2021 2022 2023 of the mobile RTP device 2024 including control of processing 2035 and applications 2035 (such as digital realities construction); and with communications such as WiFi 2036, WiMAX 2036, cellular radio 2036, satellite 2036, etc.

In some examples a mobile RTP's 2004 may be comprised of a space-based device 2024 in a location such as aboard a weather satellite orbiting the Earth 2032; with sensors in some examples such as a camera 2033, infrared night camera 2033, etc.; with power sources such as solar 2034, battery 2034, etc.; with remote control 2021 2022 2023 of the RTP device 2024 including control of processing 2035 and applications 2035 (such as digital realities construction); and with communications such as satellite 2036, radio 2036, etc.

TP devices architecture and processing: Today a few hundred dollars buys a graphics card (a GPU or Graphics Processing Unit) that is more powerful then most supercomputers from a decade ago. Just as graphical processing transformed "green screen" text interfaces into GUIs (Graphical User Interfaces), today's continuously advancing CPUs and GPUs turn photographs into real looking images that never existed; or turn photographs into many styles of paintings; or help design large buildings with architectural plans that are ready to be built; or model structures to test them for wind, sun and shadow patterns, neighborhood traffic, and much more; or play computer games with real-time cinema quality realism and surround sound; or construct digital realities; or design personal clothes online that will be delivered in less than a week; or show live football games on television with dynamic first down lines and information (like large "3$^{rd}$ and 10" signs) displayed on the ground under the 22 live football players moving on the field). To do this CPUs evolved into multi-core CPUs that are now routinely shipped in computers and computing devices of all sizes and types. Already starting, the design and shipment of devices that include multi-core GPU's, multiple GPU's and multiple coprocessors has begun and greater GPU processing capabilities may be expected in the future. Already, some devices could include the hardware and software to transform physical reality into "digital reality" in real time—and this may become a commonplace mainstream capability in the future.

Figure 29A:
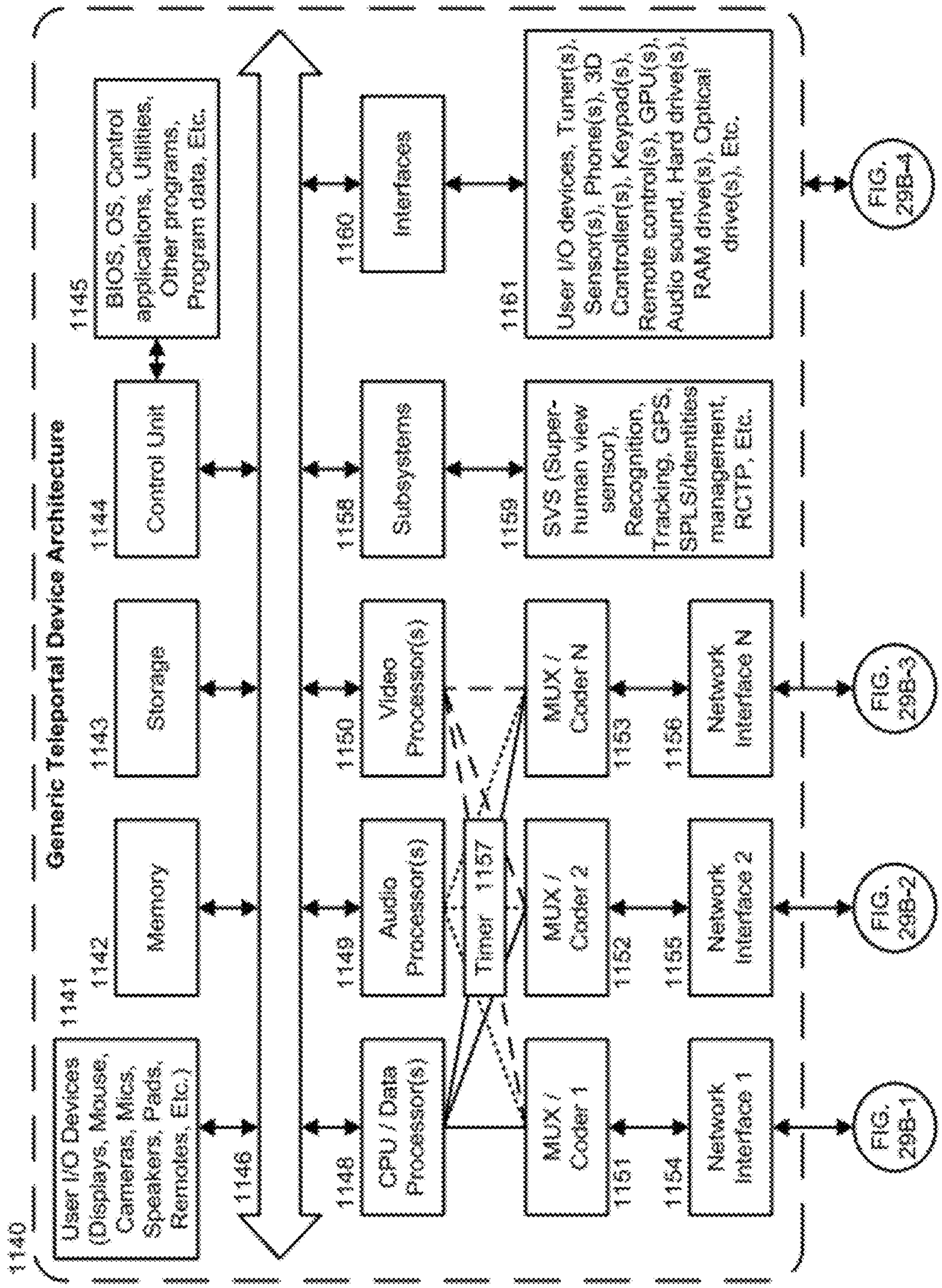
FIG. 29 is a block diagram showing an example architecture of a Teleportal device that combines digital realities creation with communications, broadcasting, remote control, computing, display and other capabilities.
Figure 29B:
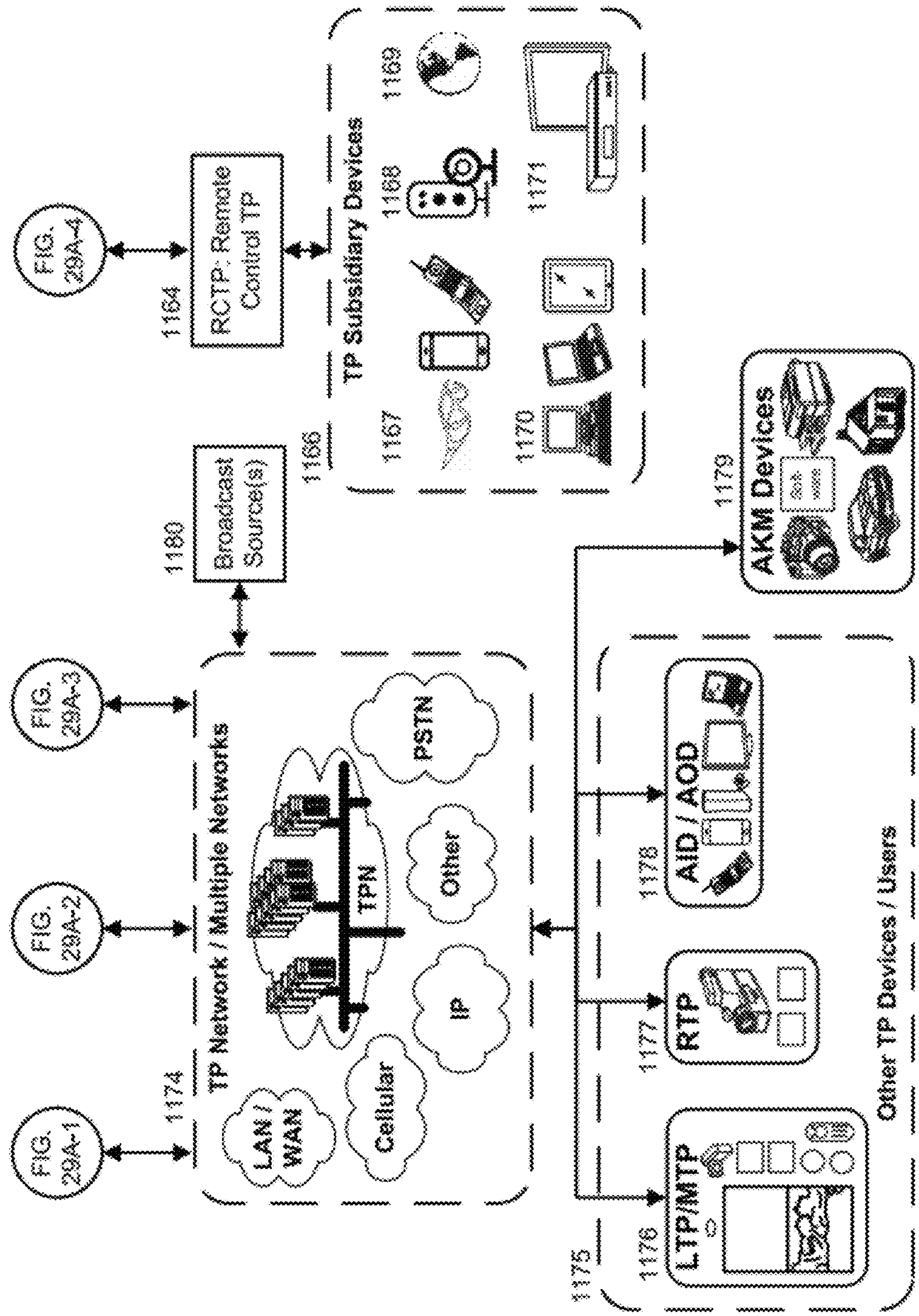

FIG. 29 through FIG. 35 provide some examples of components and features of extensible TP devices: FIG. 29, "High-level TP Device Architecture": In the "mainframe era" of computing, the computing capacity of an entire mainframe computer is eclipsed by one of today's advanced laptop computers. In some examples a plurality of components, systems, methods, processes, technologies, devices and other means are combined in varying ways to form a TP device. FIG. 29 describes an architecture for combining the capacity of a plurality of devices within a single TP device including digital realities creation (as described elsewhere), with other communications, broadcasting, editing, and display capabilities with the capacity and features of a single TP device as described elsewhere.

Figure 30:
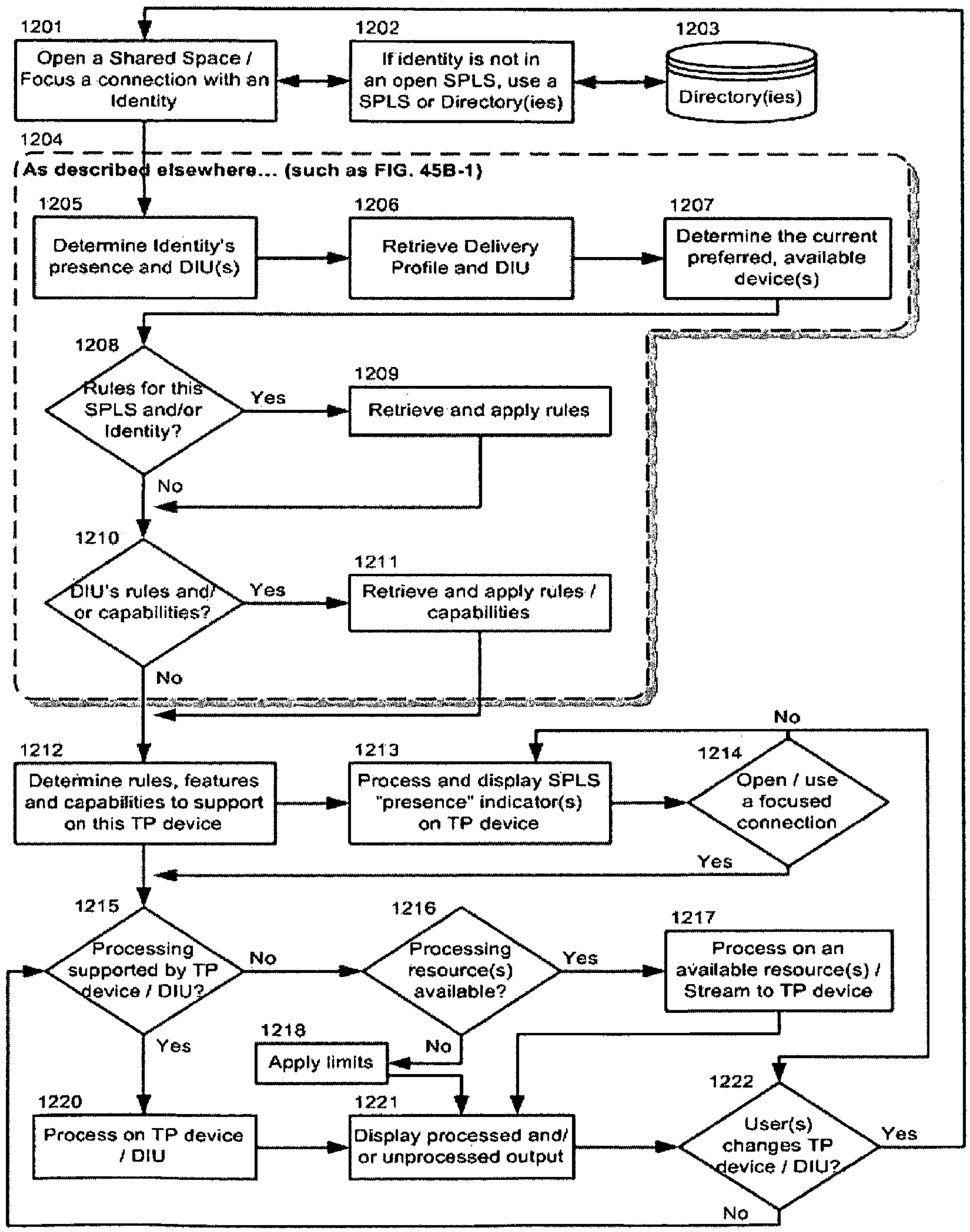
FIG. 30 is a flow chart showing some procedures for determining Teleportal processing locations based on the capabilities of each device.

FIG. 30, "TP Device Processing Location(s)": In some examples the TP processing required (such as for a given video and/or audio synthesis or other TP processing as described elsewhere) is supported by a TP device, in which case it can be performed by said device. In some examples, however, the required TP processing is not supported by a given TP device in which case it is determined whether or not an appropriate remote TP processing resource is available, and if available said required TP processing can be performed on the remote TP resource with the output streamed to the TP device. However, if a remote TP resource is not available then the TP device's limits are applied to the TP device's processing so that only its limited processing capabilities are applied to produce the limited output that is displayed.

Figure 31A:
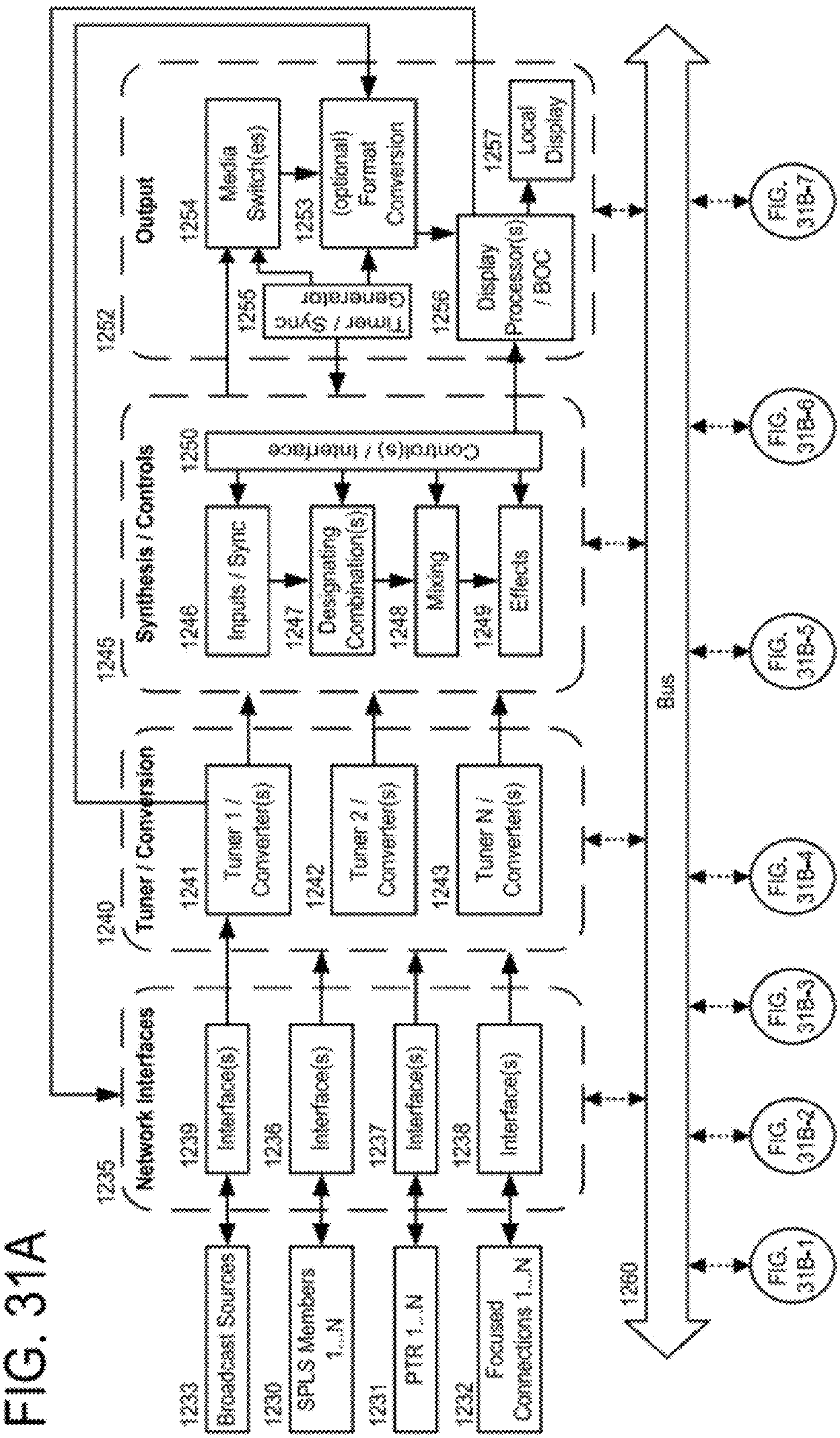
FIG. 31 is a block diagram showing some processing flows in a Teleportal device.
Figure 31B:
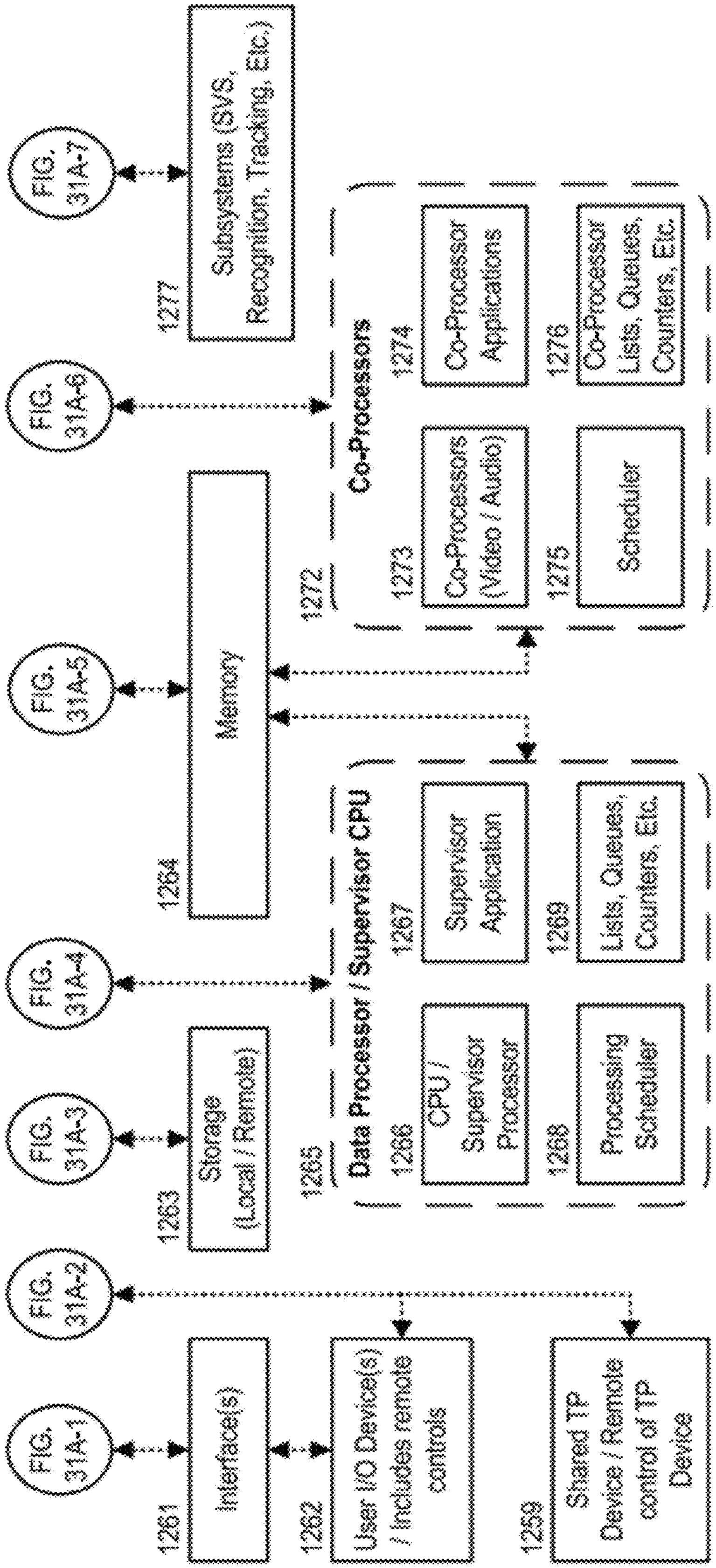

FIG. 31, "TP Device Processing Components Flow": In some examples TP devices simultaneously receive from a plurality of sources and send to a plurality of recipients that can be in some examples one or a plurality of SPLS members; in some examples one or a plurality of IPTR; in some examples one or a plurality of focused connections; in some examples one or a plurality of broadcast sources; and in some examples one or a plurality of other types of networked electronic connections. In some examples TP devices simultaneously convert data received from said plurality of sources, as well as simultaneously convert data sent to said plurality of sources into an appropriate format(s) for internal processing. In some examples TP devices simultaneously synthesize and combine one or a plurality of digital realities (as described elsewhere). In some examples TP devices simultaneously generate and display one or a plurality of outputs in one or a plurality of formats on one or a plurality of local and/or remote displays, including in some examples storing said outputs for future use, in some examples for future broadcasts, in some examples for other purposes and functions. In some examples TP devices are under user control such that the various inputs, outputs, synthesis, editing, mixing, effects, displays and other functions may be varied and directed by a plurality of types of user controls. In some examples a plurality of user I/O devices may be utilized by a user during the use of a TP device. In some examples a plurality of storage means may be utilized by a TP device. In some examples a plurality of memory means may be utilized by a TP device. In some examples one or a plurality of CPUs, including in some examples multi-core CPUs, may be utilized by a TP device. In some examples a plurality of GPUs, including in some examples multi-core GPUs, may be utilized by a TP device. In some examples one or a a plurality of subsystems may be utilized by a TP device.

Figure 32A:
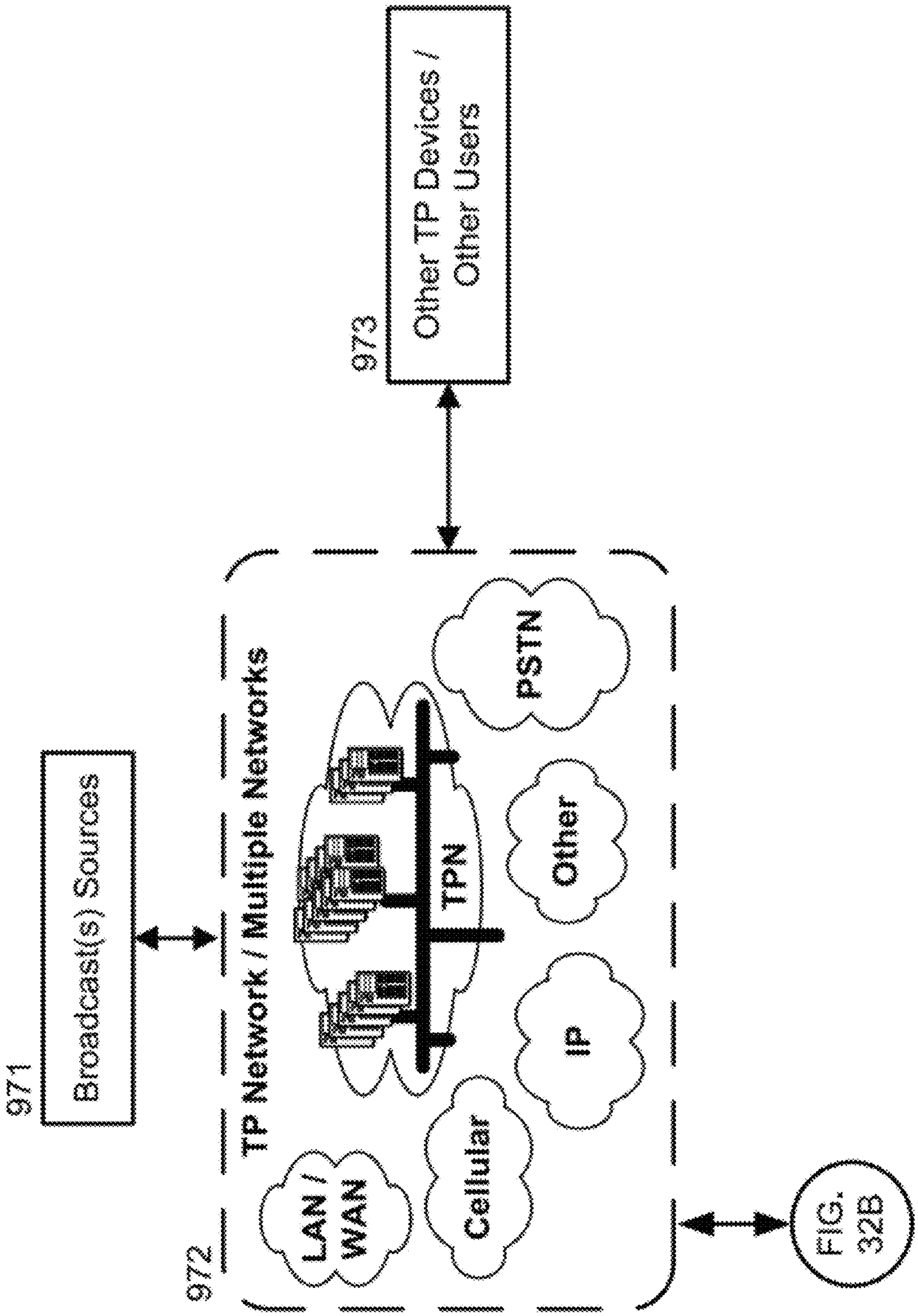
FIG. 32 is a block diagram showing some processing flows of receiving broadcasts and broadcasting, which in some examples may include watching, recording, editing, digitally altering, synthesizing, broadcasting, etc.
Figure 32B:
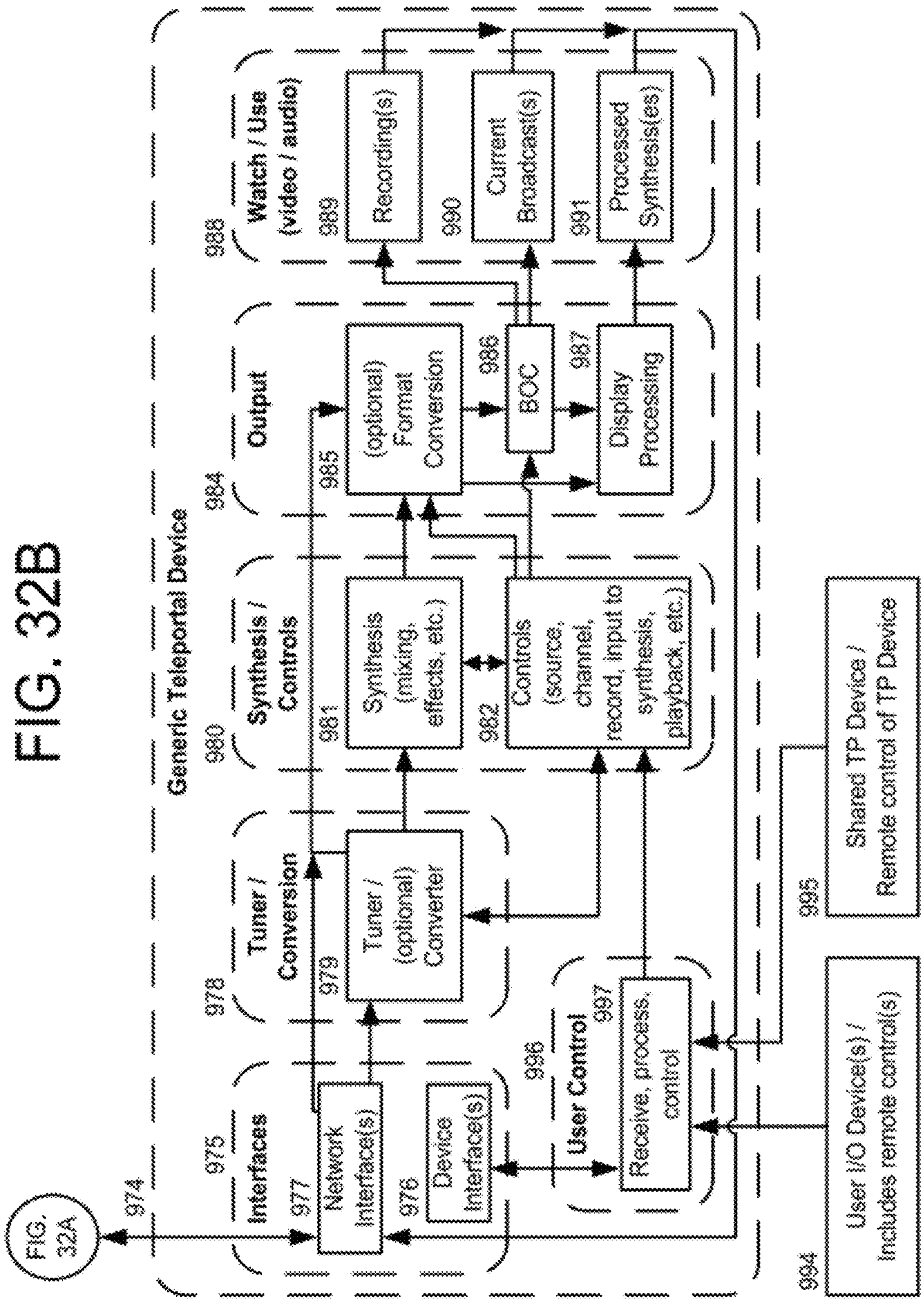

FIG. 32, "TP Device Processing of Broadcasts": In some examples a TP device may be utilized for watching one or a plurality of broadcast sources; in some examples for recording one or a plurality of broadcast sources; in some examples for digitally altering one or a plurality of live broadcasts; in some examples for digitally altering one or a plurality of recorded broadcasts; in some examples or utilizing parts or all of a live or recorded broadcast in a digital synthesis; in some examples for broadcasting a recorded broadcast; in some examples for broadcasting a digitally synthesized live or recorded broadcast; and in some examples for performing other functions as described herein.

Figure 33:
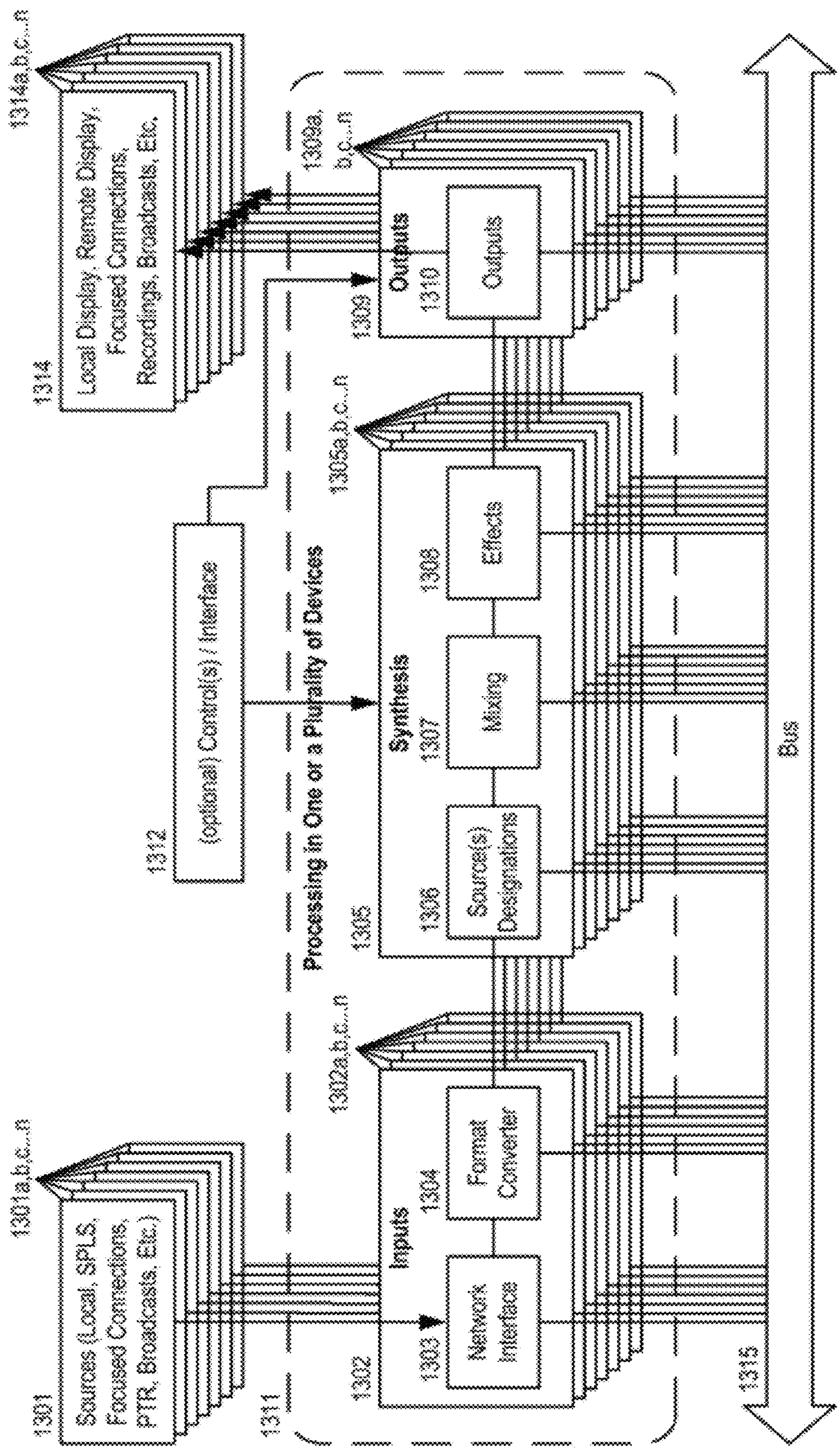
FIG. 33 is a block diagram showing some simultaneous multiple processes in Teleportal processing.

FIG. 33, "TP Device Processing—Multiple/Parallel": In some examples TP devices can process one or a plurality of simultaneous connections by means of a scalable plurality of in some examples simultaneous processes; in some examples simultaneous processing; and in some examples simultaneous connections.

Figure 34A:
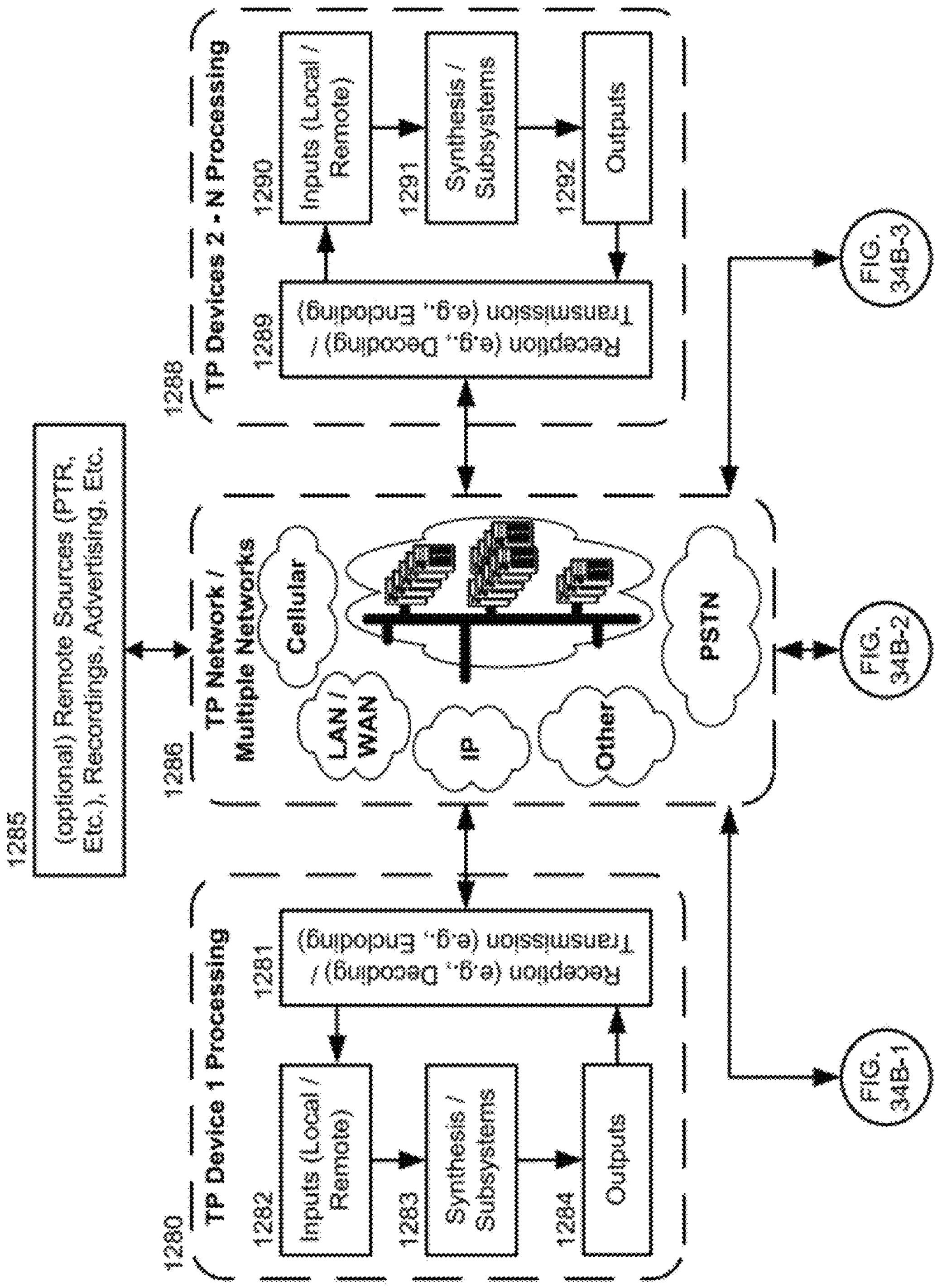
FIG. 34 is a block diagram showing some examples of Teleportal processing within one device and/or within a plurality of devices, the utilization of remote resources in processing, multiple devices' processing of the same focused connection, etc.
Figure 34B:
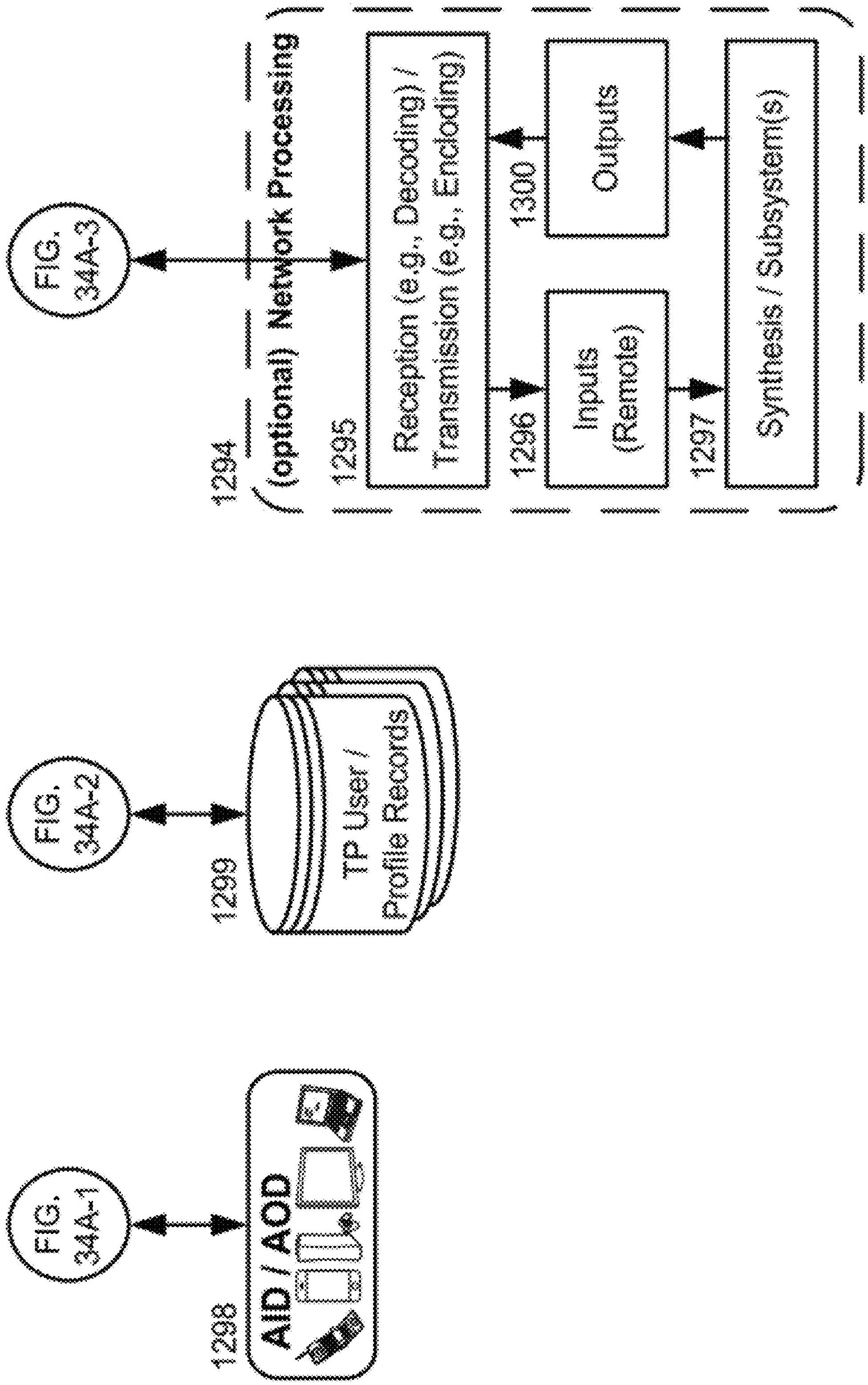

FIG. 34, "Local and Distributed TP Device Processing Locations": In some examples some or all TP device processing is performed by a sending TP device; in some examples some or all TP device processing is performed by a receiving TP device; in some examples some or all TP device processing is performed remotely such as by a third-party application or service or by a TP server or application on a network; in some examples TP device processing is distributed between two or a plurality of TP devices and/or third parties that are connected by means of one or a plurality of networks; and in some examples TP device processing is performed by a plurality of TP devices and/or third-parties such that different users see differently processed and differently constructed video and audio.

Figure 35A:
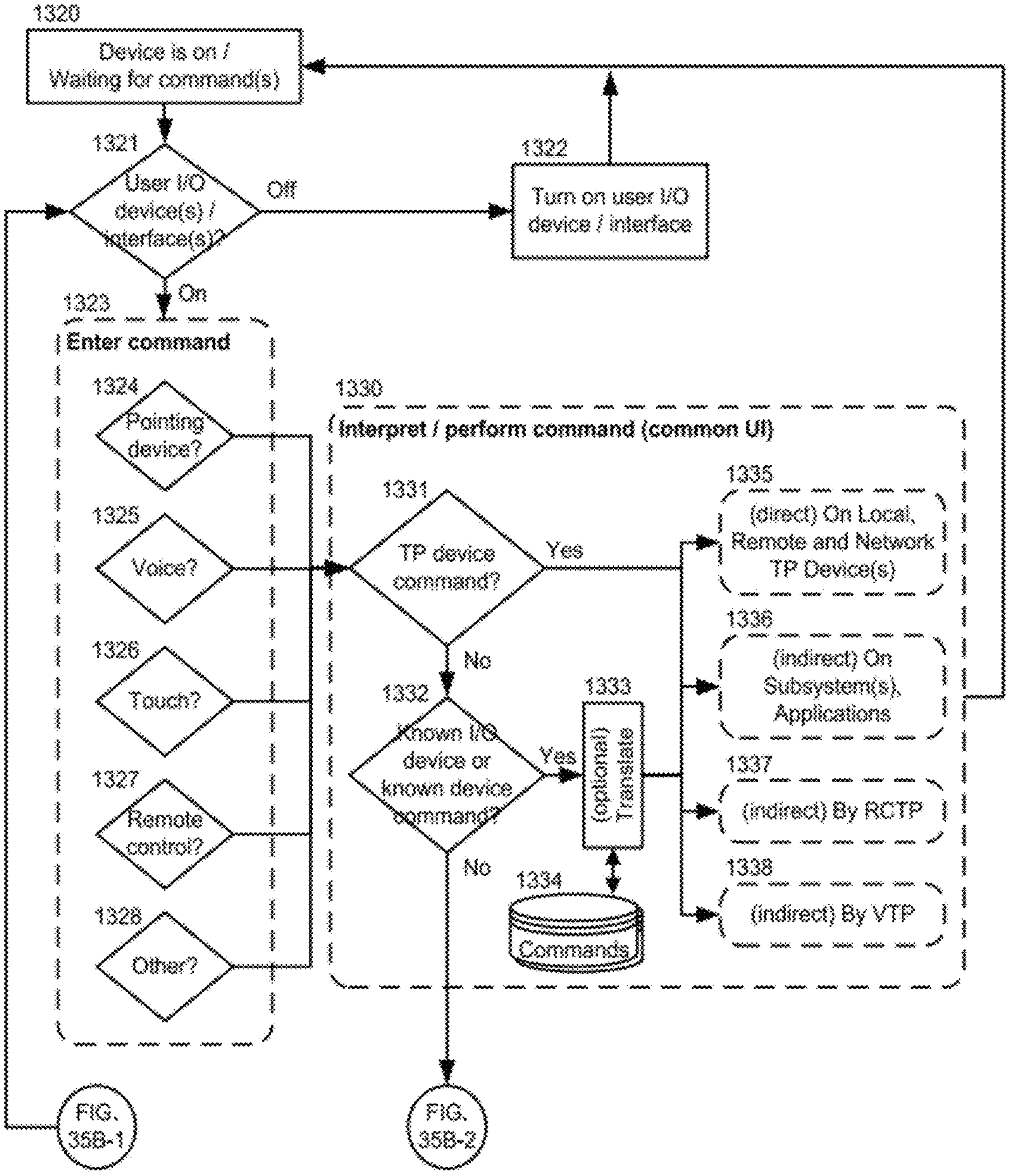
FIG. 35 is a flow chart showing some examples of commands entry to some Teleportal devices, with the addition of new I/O.
Figure 35B:
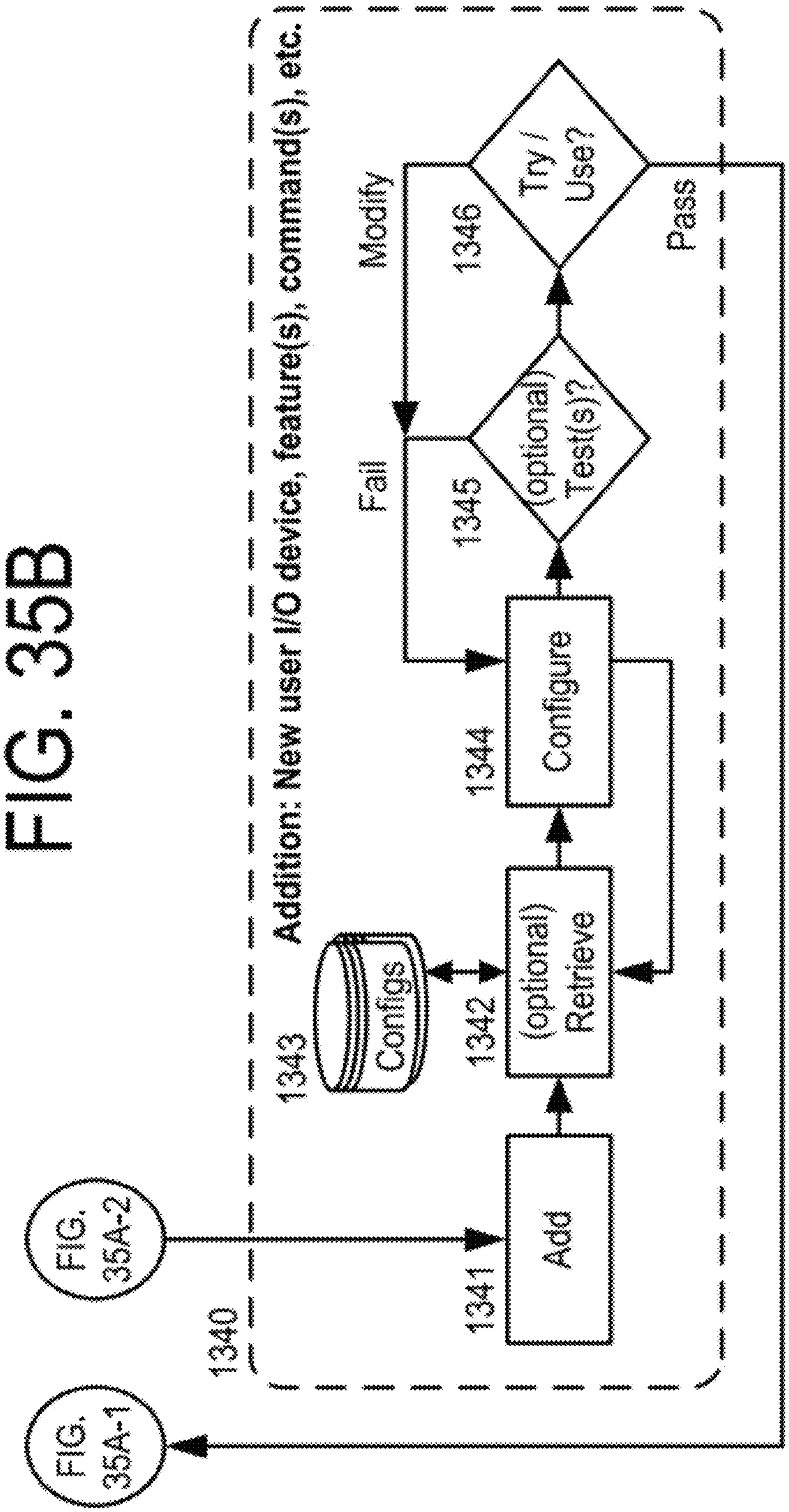

FIG. 35, "Device(s) Commands Entry": Some examples illustrate part of the process of entering commands into TP devices, including a plurality of user I/O devices such as in some examples a pointing device, in some examples physical gestures, in some examples a trackball, in some examples a joystick, in some examples voice or speech (in some examples including speakers for audio feedback), and some examples a touch interface, in some examples a graphics tablet, in some examples a touchpad, in some examples of a remote control, in some examples a camera, in some examples a puck, in some examples a keyboard, in some examples they know their device such as a smart phone running a VTP, in some examples I tracking, and some examples a 3D gyroscopic mouse, in some examples a game pad, and some examples a balance board, in some examples simulated devices such as a steering wheel or sword or musical instrument, in some examples another type of I/O means. In some examples a new I/O means may be added; in some examples a new feature may be added to an existing I/O means; and in some examples a reconfiguration of I/O means may be performed.

Turning now to FIG. 29, "High-level TP Device Architecture," TP device architecture refers to some examples of physical TP devices such as in some examples an LTP 1140; in some examples an MTP 1140; in some examples an RTP 1140; in some examples an AID/AOD 1140; in some examples a TP server 1140; in some examples a TP subsidiary device that is under RCTP control (remote control by a TP device) 1164 1166; in some examples any other extensible configuration of a TP device that includes sufficient physical components, as described elsewhere, to provide Teleportal connections 1140. The illustration in FIG. 29 may be implemented in some examples with any suitable specialized device, in some examples with a general purpose computing system, in some examples with a special-purpose computing system, in some examples with a combination of multiple networked computing systems, or in some examples with a any hardware configuration by which a TP device may be provided whether in a single device or including a distributed computing environment where various modules and functions are located in local and remote computer devices, storage, and media so that tasks are performed by separate devices and linked through a communications network(s). In some examples TP devices 1140 may include but are not limited to a customized special purpose device 1140, in some examples a distributed device with its tasks performed by two or a plurality of networked devices 1140, and in some examples another type of specialized computing device(s) 1140.

In some examples TP devices 1140 may be implemented as individually designed TP devices, in some examples as general-purpose desktop personal computers, in some examples as workstations, in some examples as handheld devices, in some examples as mobile computing devices, in some examples as electronic tablets, in some examples as electronic pads, in some examples as netbooks, in some examples as wireless phones, in some examples as in-vehicle devices, in some examples as a device that is a component of equipment, in some examples as a device that is a component of a system, in some examples as servers, in some examples as network servers, in some examples as mainframe computers, in some examples as distributed computing systems, in some examples as consumer electronics, in some examples as online televisions, in some examples as television set-top boxes, in some examples as any other form of electronic device. In some examples said TP device 1140 is physically located with a user who is in a focused connection; in some examples said TP device 1140 is owned by a user who is in a focused connection but is remote from said TP device and is utilizing it for processing; in some examples said TP device 1140 is owned by a third party such as a service and said TP device's processing is an element of said service; in some examples said TP device 1140 is an element of a network that is being utilized for a Teleportal connection; in some examples said TP device 1140 is at any network accessible location.

In some examples TP devices 1140 may include but are not limited to a high-level illustration of the use of said TP device 1140 to open SPLS(s) (Shared Planetary Life Spaces) presence connections (as described elsewhere in more detail) and focus TP connections (as described elsewhere in more detail). In some examples a first step is to open one or a plurality of SPLS's (Shared Planetary Life Spaces), a second step is to focus one or a plurality of TP connections with SPLS members, a third step is to add additional PTR to one or more focused TP connections, and a fourth or later step is to perform other TP functions as described elsewhere. The program (s), module(s), component(s), instruction(s), program data, user profile(s) data, IPTR data, etc. that enable operation of the TP device 1140 to perform said steps may be stored in local storage 1143 and/or remote storage 1143 and retrieved as needed to operate said TP device 1140. As SPLS's are opened, focused connections are made, IPTR added, or other functions utilized an output video is generated to include the appropriate participants as described elsewhere, and other context may be added to said output video such as a place(s), advertisement(s), content(s), object(s), etc. as described elsewhere; with said output video generated in some examples at one or a plurality of the participants' local TP devices 1140, in some examples at one or a plurality of their remote TP devices 1140, in some examples at a remote TP device that is an element of a network 1174, in some examples by a TP server or TP service that is attached to a network 1174, or in some examples by other means as described elsewhere. In some examples this enables a single TP device 1140 to provide the output video; and some examples this enables a plurality of TP devices 1140 to provide a plurality of output videos that are customized for different participants as specified by each participant either manually or automatically (as described elsewhere). In some examples participants utilize TP devices 1140 that contain the appropriate components and capabilities to produce output video; while in some examples one or a plurality of participants utilize TP devices that are able to communicate but are not able to produce output video (which is processed separately from their TP device) 1140; while in some examples one or a plurality of TP devices 1140 possess only limited capabilities such as in some examples decoding video or audio, in some examples decompressing video or audio, and in some examples generating a signal that is formatted for display on that particular TP device.

In some examples said TP device components include a plurality of known devices, systems, methods, processes, technologies, etc. which are constituents that are combined in varying new or known ways to form a TP device. In some examples TP devices 1140 may include but are not limited to a system bus 1146 that couples system components such as one or a plurality of processors 1148 1149 1150, memory 1142, storage 1143, and interfaces 1160 1161 that in turn connect user I/O devices 1141, subsidiary processors such as in some examples a broadcast tuner(s) 1161, in some examples a GPU (Graphics Processing Unit), 1161, in some examples an audio sound processor 1161, and in some examples another type of subsidiary processor 1161. In some examples the system bus 1146 may be of any known type of bus including a local bus, a memory bus or memory controller, and a peripheral bus; with some examples of known bus architectures including Microchannel Architecture (MCA) bus, Industry Standard Architecture (ISA) bus, Enhanced ISA (EISA) bus, Video Electronics Standards Association (VESA) local bus, Peripheral Component Interconnect (PCI) bus, or any known bus architecture.

In some examples said TP device 1140 may include but is not limited to a plurality of known types of computer readable storage media 1143, which may include any available type of removable or non-removable storage media, or volatile or nonvolatile storage media that may be accessed either locally or remotely including in some examples Teleportal Network servers or storage 1143, in some examples one or a plurality of other Teleportal devices' storage 1143, in some examples a remote data center(s) 1143, in some examples a Storage Area Network (SAN) 1143, or in some examples other remote information storage 1143. In some examples in some examples storage 1143 may be implemented by any technology and method for information storage such as in some examples computer readable instructions, in some examples data structures, in some examples program modules, or in some examples other data. In some examples computer storage media includes but is not limited to one or a plurality of hard disk drives 1143, in some examples RAM 1143, in some examples ROM 1143, in some examples DVD 1143, in some examples CD-ROM 1143, in some examples of other optical disk storage 1143, in some examples flash memory 1143, in some examples EEPROM 1143, in some examples other memory technology 1143, in some examples magnetic tape 1143, in some examples magnetic cassettes 1143, in some examples magnetic disk storage 1143, in some examples other magnetic storage devices 1143. In some examples storage 1143 is connected to the system bus 1146 by one or a plurality of interfaces 1160 such as in some examples a hard disk drive interface 1160 1161, in some examples an optical drive interface 1160 1161, in some examples a magnetic drive interface 1160 1161, in some examples another type of storage interface 1160 1161.

In some examples said TP device 1140 may include but is not limited to a control unit 1144 which may include components such as a basic input/output system (BIOS) 1145 that contains some routines for transferring information between elements of a TP device such as in some examples during startup. In some examples a control unit 1144 may include components such as in some examples an operating system 1145, control applications 1145, utilities 1145, application programs 1145, program data 1145, etc. In some examples said operating system 1145, control applications 1145, utilities 1145, application programs 1145, or program data 1145 may be stored in some examples on a hard disk 1143, in some examples in ROM 1142, in some examples on an optical disk 1143, in some examples in RAM 1142, in some examples in another type of storage 1144, or in some examples in another type of memory 1142.

In some examples said TP device 1140 may include but is not limited to memory 1142 which may include random access memory (RAM) 1142, in some examples read only memory (ROM) 1142, in some examples flash memory 1142, or in some examples other memory 1142. In some examples memory 1142 may include a memory bus, in some examples a memory controller 1160, in some examples memory 1143 may be directly integrated with one or a plurality of processors 1148 1149 1150, or in some examples another type of memory interface 1160.

In some examples said TP device's 1140 components are connected to the system bus 1146 by a unique interface 1160 or in some examples by an interface 1160 that is shared by two or a plurality of components 1160; and said interfaces may in some examples be a user I/O device interface 1160 1161, in some examples a storage interface 1160 1161, in some examples another type of interface 1160 1161. In some examples said TP device 1140 may include but is not limited to one or a plurality of user I/O devices 1141 which in some examples includes a plurality of input devices and output devices such as a mouse/mice 1141, in some examples a keyboard(s) 1141, in some examples a camera(s) 1141, in some examples a microphone(s) 1141, in some examples a speaker(s) 1141, in some examples a remote control(s) 1141, in some examples a display(s) or monitor(s) 1141, in some examples a printer(s) 1141, in some examples a tablet(s) or pad(s) 1141, in some examples a touchscreen(s) 1141, in some examples a touchpad(s) 1141, in some examples a joystick(s) 1141, in some examples a game pad(s) 1141, in some examples a wireless hand-held 3-D pointing device(s) or controller(s) 1141, in some examples a trackball(s) 1141, in some examples a configured smart phone(s) 1141, in some examples another type of user I/O device 1141. In some examples these user I/O devices are connected to the system bus 1146 by one or a plurality of interfaces 1160 such as in some examples a video interface 1160 1161, in some examples a Universal Serial Bus (USB) 1160 1161, in some examples a parallel port 1160 1161, in some examples a serial port 1160 1161, in some examples a game port 1160 1161, in some examples an output peripheral interface 1160 1161, in some examples another type of interface 1160 1161.

In some examples TP devices 1140 may include but are not limited to one or a plurality of user interface(s) components to select TP device options, control the opening and closing of SPLS's and/or their individual members, control focusing a connection and its individual attributes, control the addition and synthesis of IPTR such as in a focused connection, control the TP display(s), and control other aspects of the operation of said TP device 1140; and these controls may be included in any known or practical interface arrangement, layout, design, alignment, user I/O device, remote control of a Teleportal, etc. In addition, updates to TP device interfaces, options, controls, features, etc. may be downloaded and applied to said TP device 1140 in some examples automatically, in some examples periodically, in some examples on a schedule, in some examples by a user's manual control, or in some examples by any known means or process; and if downloaded said updates may in some examples be available and presented for immediate use, in some examples the user may be informed when said updates are made, in some examples the user may be asked to approve said updates before they are available for use, in some examples the user may be required to approve the downloading and installation of said updates, in some examples the user may be required to run a setup process to install an update, and in some examples any other known download and/or installation process may be utilized.

In some examples said TP device 1140 may include but is not limited to one or a plurality of processors 1148 1149 1150, such as in some examples a single Central Processing Unit (CPU) 1148, in some examples a plurality of processors 1148 1149 1150 which in some examples include one or a plurality of video processors 1150, in some examples include one or a plurality of audio processors 1149, in some examples include one or a plurality of GPUs (Graphics Proccessing Units) 1149 1150, and in some examples include a control CPU 1148 that provides control and scheduling of other processors 1149 1150. In some examples TP devices 1140 may include but are not limited to a supervisor CPU 1148 along with one or a plurality of co-processors 1149 1150 that are variable in number, selectable in use and coupled by a bus 1146 with the supervisor CPU 1148. In some examples the supervisor CPU 1148 and co-processors 1149 1150 employ memory 1142 to store portions of one or a plurality of video streams, video inputs, partially processed video, video mixes, video effects, etc. (in which the term "video" includes related audio). In some examples a supervisor application is run by the supervisor CPU 1148 to control each co-processor 1149 1150 to read a selected portion of the video temporarily stored in memory 1142; process it 1149 1150 such as by mixing, effects, background replacement(s), etc. as described elsewhere; and output it for display and/or transmission to a designated recipient(s). In some examples a supervisor application is run by the supervisor CPU 1148 to manage in some examples the user instructions for the video synthesis of focused connections such as the synthesis of the view(s) in a focused connection, in some examples the currently open SPLS's, in some examples one or a plurality of logged in identities for the current user, in some examples one or a plurality of focused TP connections, in some examples one or a plurality of PTR within those focused connections, in some examples dynamic changes in the current user's presence, in some examples dynamic changes in the presence of SPLS members, in some examples dynamic changes in the presence of participants in focused TP connections, and in some examples other aspects of the operation of said TP device 1140. In some examples the number of co-processors 1149 1150 is selectable; in some examples the number of video inputs is selectable such as how many PTR in which to add to a focused connection; in some examples the number of participants in each focused connection is selectable; and in some examples other aspects of the operation of said TP device 1140 and said focused TP connections are selectable.

In some examples TP devices 1140 may include but are not limited to utilizing one or a plurality of co-processors such as video processors 1150, audio processors 1149, GPUs 1149 1150 to synthesize one or a plurality of focused connections according to each focused connection's video/audio input and participant('s) selections, and (optionally) include PTR such as in some examples a place or context, or in some examples advertisements that are personalized and customized for each participant. In some examples video processing 1150 and/or audio 1149 may be applied separately to each video input such as in some examples personal images, in some examples place backgrounds, in some examples background objects, in some examples inserted advertisements, etc.; such as in some examples resizing, in some examples resolution, in some examples orientation, in some examples tilt, in some examples alignment with respect to each other, in some examples morphing into three dimensions, in some examples coloration, etc. in some examples video processing 1150 and/or audio processing 1149 may be applied separately to each focused connection such as in some examples dividing or subdividing one or a plurality of displays to present all or parts of each focused connection in a portion said display (s) as selected by each user of each TP device 1140.

In some examples TP devices 1140 may include but are not limited to using one or a plurality of audio processors 1149 to receive and process audio signals from each source in a focused connection(s), and utilize known means to generate a 3-D spatial audio signal for playback by the local TP device's 1140 speakers, whenever two or more speakers are present that may be utilized for audio. In this manner, the audio signal may be processed 1149 to match the processed video output 1150 such as, for example when a specific participant or object are displayed on the right side, the audio from said participant or object comes from a speaker(s) on the right side of the display, and the audio 1149 is balanced properly respective to the position of its source in the synthesized video 1150. Similarly, when a focused connection's context is made a separately received place, that place's audio may be played so that it sounds natural and audible at a volume that is appropriate for the synthesized position(s) of the participants in that place. Similarly, when other video inputs and sources are combined 1150, their respective audio may be processed 1149 so that upon playback, the audio matches the processed output video 1150.

In some examples said TP device 1140 may include but is not limited to one or a plurality of network interfaces 1154 1155 1156 for transferring data (including receiving, transmitting, broadcasting, etc.) between the TP device and in some examples a network 1174, in some examples other TP devices 1175 1176 1177 1178, in some examples Remote Control (RCTP) of TP Subsidiary Devices 1166 1167 1168 1169 1170 1171, in some examples an in-vehicle telematics device(s), in some examples a broadcast source(s) 1180, and in some examples other computing or electronic devices that may be attached to a network 1174. In some examples this connection can be implemented using one or a plurality of known types of network connections that are connected to the TP device 1140 in some examples any type of wired network 1174, in some examples any direct wired connection with another communicating device, in some examples any type of wireless network 1174, and in some examples any type of wireless direct connection 1174. In some examples this connection can be implemented using one or a plurality of known types of networks in some examples by means of the Internet 1174, in some examples by means of an Intranet 1174, in some examples by means of an Extranet 1174, in some examples by means of other types of networks as described elsewhere 1174. In some examples this connection can be implemented using one or a plurality of known types of networking devices that are connected to said TP device 1140 in some examples to a network and in some examples directly connected to any type of communicating device, such as in some examples a broadband modem, in some examples a wireless antenna, and some examples a wireless base station, in some examples a Local Area Network (LAN) 1174, in some examples a Wide Area Network (WAN) 1174, in some examples a cellular network 1174, in some examples an IP or TCP-IP network 1174, in some examples a PSTN 1174, in some examples any other known type of network. In some examples said TP device 1140 can be connected using one or a plurality of peer-to-peer environments which in some examples include real-time communications whereby connected TP devices 1140 1175 communicate directly in a peer-to-peer manner with each other.

In some examples said TP device 1140 may operate in a network environment with one or a plurality of networks 1174 using said network(s) to form a connection(s) with one or a plurality of TP devices 1175 such as in some examples an LTP 1176; in some examples an MTP 1176; in some examples an RTP 1177; in some examples an AID/AOD 1178; in some examples a TP server 1174; in some examples a TP subsidiary device that is under RCTP control (remote control by a TP device) 1164 1166 1167 1168 1169 1170 1171; in some examples any other TP connections between an extensible TP device 1140 and a compatible remote device through means such as a network interface(s) 1154 1155 1156 and a network(s) 1174. When a LAN network environment 1174 is used a network interface or adapter 1154 1155 1156 is typically employed for the LAN interface; and in turn, the LAN may be connected to a WAN 1174, the Internet 1174, or another type of network 1174 such as by a high bandwidth converged communication connection. When a directly connected WAN network environment 1174 is used, or a directly connected Internet network environment 1174 is used, or other direct means for establishing a communications link(s), a modem is typically employed; and said modem may be internal or external to said TP device 1140. When one or a plurality of broadcast sources 1180 are used, the components and processes are described elsewhere, such as in FIG. 32.

In some examples TP devices 1140 may include but are not limited to one or a plurality of network interfaces 1154 1155 1156 which each has a mux/demux 1151 1152 1153 that multiplexes/demultiplexes signals to and from the audio processor(s) 1149, video processor(s) 1150, GPU(s) 1149 1150, and CPU/data processor 1148; and in some examples each network interface 1154 1155 1156 has a format converter 1151 1152 1153 such as to convert from and to various video and/or audio formats as needed; and in some examples each network interface 1154 1155 1156 has an encoder/decoder (herein termed "Coder") 1151 1152 1153 that decodes/encodes video streams to and from a TP device 1140, and in some examples one or a plurality of these conversion steps 1151 1152 1153 may be provided by one or a plurality of codecs. In turn, these varying combinations of network interfaces 1154 1155 1156, mux/demux 1151 1152 1153, format converter 1151 1152 1153, encoder/decoder 1151 1152 1153, and codec(s) 1151 1152 1153 provide input from and output to network(s) 1174.

In some examples said TP device 1140 may include but is not limited to one or a plurality of multiplexers and demultiplexers (referred to in the figure as "MUX") 1151 1152 1153 which in some examples provides switching such as selecting one of many analog or digital signals and forwarding the selected signal into a single line; in some examples combining several input signals into a single output signal; in some examples enabling one line from many to be selected and routed through to a particular output; in some examples combining two or more signals into a single composite signal; in some examples routing a single input signal to multiple outputs; in some examples sequencing access to a network interface so that multiple different processes may share a single interface whether for receiving signals or for transmitting signals; in some examples converting analog signals to digital; in some examples converting digital signals to analog; in some examples providing filters so that output signals are filtered; in some examples sending several signals over a single output line such as with time division multiplexing; in some examples sending several signals over a single output line such as with frequency division multiplexing; in some examples sending several signals over a single output line such as with statistical multiplexing; and in some examples taking a single input line that carries multiple signals and separating those into their respective multiple signals.

In some examples said TP device 1140 may include but is not limited to one or a plurality of encoders/decoders (referred to in the figure as "Coder") 1151 1152 1153 and/or decoders 1151 1152 1153 (referred to in the figure as "Coder") which in some examples provides conversion of data from one format (or code) to another such as in some examples from an analog input to a digital data stream (A/D conversion, such as converting an analog composite video signal into a digital component video signal that includes a luminance signal, a color difference signal [Cb signal] and a color difference signal [Cr signal]); in some examples converts varied audio, video and/or text input into a common or standard format; in some examples compresses data into a smaller size for more efficient transmission, streaming, playback, editing, storage, encryption, etc.; in some examples simultaneously converts and compresses audio, video and/or text; in some examples converts signal formats that the TP device cannot process and encodes them in a format the TP device can process; in some examples provides conversion from one codec to another; in some examples taking audio and video data from a TP device and converting it to a format suitable for streaming, transmission, playback, storage, encryption, etc.; in some examples decoding data that has been encoded; in some examples decrypting data that has been encrypted; in some examples receiving a signal and turning it into usable data; and in some examples converting a scrambled video signal into a viewable image(s). In some examples said TP device 1140 may include but is not limited to one or a plurality of codecs (referred to in the figure as "Coder") 1151 1152 1153 which in some examples provides encoding and/or decoding of one or a plurality of digital data streams and/or signals, such as for editing, transmission, streaming, playback, storage, encryption, etc.

In some examples said TP device 1140 may include but is not limited to one or a plurality of timers 1157 which in some examples are also known as sync generators; in some examples a timer counts time intervals and generates timed clock pulses used to synchronize video picture signals and/or video data streams; in some examples timing is used to synchronize various different video signals for editing, mixing, synthesis, output, transmission, streaming, etc.; in some examples timer pulses are utilized by one or a plurality of processors 1148 1149 1150 as timing instructions, as interrupt instructions, etc. to help control various steps in the editing, synthesis, mixing and/or effects process(es) such as mixing a plurality of different video signals from different sources and outputting a single synthesized and mixed video; in some examples to help control various steps in importing one or a plurality of special effects to a video; in some examples to help control various steps in outputting one or a plurality of videos into a single video output; in some examples to help control various steps in streaming one or a plurality of videos; in some examples to help control various other video timing or display functions.

In some examples said TP device 1140 may include subsystems 1158 1159 in which a subsystem is a specialized "engine" that provides specific types of functions and features including in some examples Superior Viewer Sensor (SVS) subsystem 1159; in some examples background replacement subsystem 1159; in some examples a recognition subsystem 1159 which provides recognitions such as faces, identities, objects, etc.; in some examples a tracking identities and devices subsystem 1159; in some examples a GPS and/or location information subsystem 1159; in some examples an SPLS/identities management subsystem 1159; in some examples TP session management subsystem that operates across multiple devices 1159; in some examples an automated serving subsystem such as a virtual concierge 1159, in some examples a selective cloaking or invisibility subsystem 1159, and in some examples other types of subsystems 1159 with each's associated functions and features. In some examples a subsystem may be within a single TP device; in some examples a subsystem may be distributed such that various functions are located in local and remote TP devices, storage, and media so that various tasks and/or program storage, data storage, processing, memory, etc. are performed by separate devices and linked through a communications network(s); and in some examples a parts or all of a subsystem may be provided remotely. In some examples one or a plurality of a subsystem's functions may be provided by means other than a device subsystem; in some examples one or a plurality of a subsystem's functions may be a network service; in some examples one or a plurality of a subsystem's functions may be provided by a utility; in some examples one or a plurality of a subsystem's functions may be provided by a network application; in some examples one or a plurality of a subsystem's functions may be provided by a third-party vendor; and in some examples one or a plurality of a subsystem's functions may be provided by other means. In some examples the equivalent of a device's subsystem may be provided by means other than a device subsystem; in some examples the equivalent of a device's subsystem may be a network service; in some examples the equivalent of a device's subsystem may be provided by a utility; in some examples the equivalent of a device's subsystem may be a remote application; in some examples the equivalent of a device's subsystem may be provided by a third-party vendor; and in some examples the equivalent of a device's subsystem may be provided by other means.

In some examples some TP devices 1140 may include but are not limited to AID's/AOD's that do not have nor do they require special internal components for processing Teleportal sessions, including opening and maintaining SPLS's, focusing one or a plurality of connections, or other types of Teleportal functions. AID's/AOD's may require nothing more then a wired and/or wireless network connection, and the ability to download and run a VTP (Virtual Teleportal) software application, in which case Teleportal processing is performed by a TP device that is attached to a network such as 1298 1280 1294 in FIG. 34. In some examples a user manually downloads a VTP application to an AID/AOD 1298 and runs it for each TP session; in some examples a user downloads a VTP application and saves it to the AID/AOD 1298 so it is available to be run in each time it is needed; in some examples a user downloads a VTP application and saves it and it's TP data locally on the AID/AOD 1298; in some examples a'VTP stub application may be all that the AID/AOD can store, so when that is run the VTP is automatically downloaded, received and run at that time on the AID/AOD 1298; in some examples a VTP application or a VTP stub automatically downloads to the AID/AOD 1298 additional applications software and/or a user's TP data even if not requested by the user; in some examples a VTP is initiated, downloaded, installed and run on an AID/AOD 1298 by other methods and processes as described elsewhere.

TP device processing locations: FIG. 30, "TP Device Processing Location(s)," provides some examples of TP devices processing, which are exemplified and described elsewhere in more detail (such as some examples that start in FIG. 112). In some examples illustrated by FIG. 30 some or all TP device processing is performed within a single TP device; in some examples some or all TP device processing is performed by a receiving TP device; in some examples some or all TP device processing is performed remotely such as by a third-party application or service or by a TP server or TP application on a network; in some examples some or all TP device processing is distributed between two or a plurality of TP devices and/or third-parties that are connected by means of one or a plurality of networks; and in some examples TP device processing is performed by a plurality of TP devices and/or third-parties such that different users see differently processed and differently constructed video and audio.

Turning now to FIG. 30 which provides some examples of TP device processing locations, in some examples TP device processing includes opening an existing SPLS (Shared Space) 1201, and in some examples TP device processing includes focusing a connection with an identity who is a member of the opened SPLS 1201. In some examples the identity is in a SPLS but not an SPLS that is open 1202, then that SPLS may be opened 1202. In some examples the identity is not in a SPLS 1202 but said identity may be retrieved from a TPN Directory(ies) 1202 1203, or may be retrieved from a different (non-TPN) Directory(ies) 1202 1203. In some examples TP device processing proceeds by determining said identity's presence 1205 and current DIU (Device in Use) 1205, which includes retrieving the identity's delivery profile 1206 and DIU identification 1206 so that the identity's current available device(s) 1207 may be determined. In some examples if there are presence, connection or other rules for the SPLS of which the identity as a member 1208, then retrieve those rules 1209 and apply those rules 1209 (as described elsewhere). In some examples if there are presence, connection or other rules for that specific identity 1208, then retrieve those rules 1209 and apply those rules 1209 (as described elsewhere). In some examples if there are connection rules for the DIU 1210 or other rules for the DIU 1210, then retrieve those rules 1211 and apply those rules 1211. In some examples if there are DIU rules 1210, then retrieve those rules 1211 and apply those rules 1211. In some examples if there are DIU capabilities features 1210 or DIU capabilities limits 1210, then retrieve that DIU's features or limits 1211 and apply those to the focused connection 1211. In some examples the combination of various SPLS rules, identity rules, DIU features, etc. 1212 are utilized to process and display an identity's "presence" 1213 on a TP device, with storage of those various rules 1209 1211 1212, DIU capabilities 1211 1212, etc. until they are needed.

In some examples when that identity is focused 1214, the previously retrieved rules 1209 1211 1212, DIU capabilities 1211 1212, etc. are applied to the TP device's processing of the focused connection 1214. In some examples the required TP processing 1214 1215 is supported by the TP device 1215, then perform said processing on the TP device 1220 and display the processed output on the TP device 1221. In some examples the required TP processing 1214 1215 is not supported by the TP device 1215, then in some examples determine if an appropriate remote TP processing resource is available 1216, and in some examples if a TP processing resource is available 1217, then perform said processing on the TP resource 1217, stream the output to the TP device 1217, and display the remotely processed output on the TP device 1221. In some examples the required TP processing 1214 1215 is not supported by the TP device 1215, then in some examples determine if an appropriate remote TP processing resource is available 1216, and in some examples a remote TP processing resource is not available 1217, then do not perform said processing on the TP resource 1216 1218 and instead apply the TP device's limits to the input stream 1218, and display only what is possible from the unprocessed input on the TP device 1221.

In some examples the combination of various SPLS rules, identity rules, DIU features, etc. 1212 are utilized to process and display an identity's "presence" 1213 on a TP device, with storage of those various rules 1209 1211 1212, DIU capabilities 1211 1212, etc. until they are needed for a focused connection 1214. Until that identity is focused 1214 the presence of that identity is maintained on the TP device 1213. In some examples the current TP device user changes to a different TP device 1222, and in some examples the new TP device automatically reopens the currently open SPLS's 1201 which may in some examples include retrieving and applying SPLS rules 1208 1209, in some examples include retrieving and applying identity rules 1208 1209, in some examples include retrieving and applying DIU rules 1210 1211, in some examples include retrieving and applying DIU capabilities 1210 1211, and in some examples storing said retrieved data 1208 1209 1210 1211 with presence indications on a TP device. In some examples the current TP device user changes to a different TP device 1222, and in some examples the new TP device automatically refocuses a current focus connection with an identity 1201, which may in some examples include retrieving and applying the appropriate rules 1208 1209 1210 1211, in some examples retrieving and applying DIU capabilities 1210 1211, and in some examples applying said retrieved data 1208 1209 1210 1211 with the appropriate local TP processing 1215 1220 1221, and in some examples applying said retrieved data 1208 1209 1210 1211 with the appropriate remote TP processing 1216 1217 1221.

In some examples the remote DIU user has presence in an open SPLS 1213 and changes to a different DIU device 1222, and in some examples the new DIU device's rules and capabilities 1210 are retrieved and applied 1211 to that remote user's presence indication 1212 1213. In some examples the remote DIU user is in a focused connection 1214 and changes to a different DIU device 1222, and in some examples the new DIU device's rules and capabilities 1210 are retrieved and applied 1211 to that remote user's focused connection by means of DIU processing 1215 1220 1221, and in some examples applying said retrieved data 1208 1209 1210 1211 with the appropriate remote TP processing 1216 1217 1221.

TP device components processing flow: FIG. 31, "TP Device Components and Processing Flow," provides some examples in which a plurality of components, systems, methods, processes, technologies, devices and other means are combined in varying ways to form a TP device. Various combinations increase or decrease the capabilities of different types of TP devices to meet the needs of different types of uses, customers, capabilities, features and functions as described elsewhere. In some examples said TP device synthesizes a plurality of output video picture/audio signals by mixing input video picture signals from three or more sources in any of a plurality of combinations, at one or a plurality of synthesis ratios, with one or a plurality of effects. In a preferred example said TP device comprises video/audio/data inputs 1235 with a plurality of inputs; tuners 1240, format conversion 1240 with a plurality of converters; controls 1250 with a plurality of manual user controls, stored controls and automated controls over signal selection, combination(s), mixing, effects, output(s), etc.; synthesis 1245 with a plurality of mixers, effects, etc.; output 1252 with a plurality of format converters, media switches, display processor(s), etc.; a timer/sync generator 1255 to provide clock pulses for syncing video inputs during synthesis and output; a display 1257 if the TP device is used directly by a user, or appropriate controls if the TP device is remote and its output is displayed locally; a system bus 1260; interfaces 1261 to a plurality of system components; a range of wired and wireless user I/O devices 1262 for a range of types of input/output as well as various types of TP device control; local storage 1263 that may optionally include remote storage 1263 and remote resources 1263; memory 1264 that includes both RAM memory 1264 and ROM memory 1264; one or a plurality of CPU's 1265 and co-processors 1272; and a range of subsystems 1277 that in some examples include one or a plurality of SVS (Superior Viewer Sensors), in some examples recognition, in some examples tracking, in some examples GPS/location information, in some examples session management, in some examples SPLS/identities management, in some examples in/out RCTP control, in some examples background replacement, in some examples automated serving, in some examples cloaking or invisibility, in some examples other types of subsystems. In some high-level examples said TP device receives three or more video inputs; performs processing of each video input according to control instructions; selects specific inputs for one or a plurality of syntheses; sets manual, stored or automated controls for each synthesis; synthesizes the selected inputs by means such as mixing designated inputs, combining, effects, etc. including applying control instructions corresponding to the predetermined synthesis; manually or automatically designates the output(s) from synthesis; and displays said output locally and/or remotely. In some high-level examples said TP device enables one or a plurality of desired syntheses combinations, ratios, effects, etc. between a plurality of video/audio picture signal inputs, with the desired synthesized output(s) for local and/or remote display and interactive real-time use.

In some examples a step is initial connection with external remote input sources which in some examples are SPLS members 1 through N 1230; in some examples are PTR (Places, Tools, Resources) 1 through N 1231; in some examples are TP focused connections 1 through N 1232, and in some examples are one or a plurality of broadcast sources 1233. In some examples a step is local inputs such as user I/O devices 1262 that may be connected by means of an interface 1261; which in some examples are one or a plurality of keyboards 1262, in some examples are one or a plurality of a mouse or other pointing device(s) 1262, in some examples are a touch screen(s) 1262, in some examples are one or a plurality of cameras 1262, in some examples are one or a plurality of microphones 1262, in some examples are one or a plurality of remote controls 1262, in some examples are a wireless control device like a tablet or pad 1262, in some examples are a hand-held pointing device(s) 1262, in some examples are a viewer detection sensor(s) 1262, etc. In some examples said TP device is shared 1259 and part or all of the TP device's functions are controlled by the remote user who is sharing it 1259; and in some examples said TP device is remotely controlled 1259 and part or all of the TP device's functions are controlled by the remote user who is controlling it 1259. In some examples a step includes receiving other user control sources and inputs by means such as a network interface 1235 1236 1237 1238 1239, a device interface 1261, or other means. In some examples a specific external input(s), device input(s), source(s) or online resource(s) will be new and not have previous settings for TP device processing associated with it, and in these cases default control settings 1250 are applied; in some cases different default settings 1250 may be pre-specified for various different types of inputs; in some cases a particular source type's default settings 1250 may be automatically copied from (or adapted from) other previous successful connections of that type. In some examples specific external and remote sources and inputs 1230 1231 1232 1233, or local sources and inputs 1262, may already be stored in memory 1264 or stored in storage 1263 for automatic TP device processing based upon previous control settings 1250; in some examples these may be previous individual focused connections 1232; in some examples these may be a specific category(ies) of connection(s) such as specific PTR (Place, Tool, Resource, etc. as described elsewhere) 1231 or types of PTR 1231; in some examples these may be a specific broadcast source 1233, or in some examples a specific category(ies) of broadcast sources 1233; in some examples these may be from a specific SPLS (Shared Planetary Life Space, as described elsewhere) 1230; in some examples these may be from a specific identity 1230; in some examples these may be from a specific originating group such as a particular company or organization 1230 or other source category 1230; in some examples these sources or inputs may have one or a plurality of other identifying attributes. In some examples once TP device processing has been performed, including the application of any controls 1250, said controls settings 1250 are automatically saved for automatic retrieval and reuse in the future during reconnection with that source and/or input. In some examples when any controls 1250 are used for TP device processing, the user may be asked whether or not to save the new control settings 1250 for future reconnections, and in some examples this request to save controls and/or settings may be asked only at a pre-specified time such as when a focused connection is made or when a focused connection is ended.

In some examples a TP device 1140 in FIG. 29 is connected to one or a plurality of servers by means of a network(s) 1174. In some examples said server(s) stores resources that are retrieved and used by the TP device during the operation of its various functions and features 1235 1240 1245 1252 1262 1265 1272 1277; in some examples said resources are programs; in some examples said resources are applications, in some examples said resources are services, in some examples said resources are control settings; in some examples said resources are templates; in some examples said resources are styles; in some examples said resources are data; in some examples said resources are recordings (which may include any type of stored videos, audio, music, shows, programs, broadcasts, events, meetings, collaborations, demonstrations, presentations, classes, etc.); in some examples said resources are advertisements; in some examples said resources are content that may be displayed during a focused connection; in some examples said resources are objects or images that may be displayed; in some examples other resources are stored and available for retrieval and use by a TP device. In some examples the TP device sends an automated and/or manual command to a server(s) to download one or a plurality of resources by means of a communications network(s) 1174 and network interface(s) 1235 1236 1237 1238 1239. In response to a TP device's 1140 command(s) a server(s) downloads the requested resource(s) to said TP device 1140 via a communication network(s) 1174. In some examples said TP device 1140 receives said requested resource(s) by means of its network interface(s) 1235 1236 1237 1238 1239, and stores it (them) in local storage 1263 and/or in memory 1264 as needed for each operation or function or feature 1235 1240 1245 1252 1262 1265 1272 1277.

In some examples a MIDI interface 1261 receives and delivers MIDI data (that is, MIDI tone information) from and to external MIDI equipment 1262 such as in some examples MIDI-compatible musical instruments (in some examples keyboards, in some examples guitars and string instruments, in some examples microphones, in some examples wind instruments, in some examples percussion instruments, in some examples other types of instruments), and in other examples MIDI-compatible gesture-based devices 1262 in which a user's motions generate MIDI data. In some examples tone data may utilize other standards than MIDI such as SMF or other formats, in which case a MIDI interface 1261 and MIDI equipment 1262 (including musical instruments, gesture-based devices, or other types of MIDI devices) conform to the data standard employed. In some examples a general-purpose interface 1261 may be employed instead of a MIDI interface 1261, such as in some examples a USB (Universal Serial Bus), in some examples RS-232-C, in some examples IEEE 1394, etc. and in each of these cases the appropriate data standard(s) is employed.

In some examples controls 1250 and/or controls' user interface 1250 include various options to set a range of stored and/or user editable parameters that are employed to control in some examples external inputs 1230 1231 1232 1233; in some examples local user I/O devices 1262; in some examples conversions 1240 1241 1242 1243; in some examples a tuner(s) 1240 1241 1242 1243 that selects and displays a broadcast(s) 1233; in some examples selection of inputs 1246; in some examples designation(s) of combinations 1247; in some examples synthesis during mixing 1248 such as ratios, sizes, positions, etc.; in some examples the selection and application of effects 1249 such as parameters that alter the way a selected effect alters an unprocessed input, a mixed combination or a synthesized video; in some examples the addition and specific uses of stored inputs 1263; in some examples the addition and use of other inputs; in some examples the addition and specific uses of streamed 1235 or stored 1263 external resources; in some examples during output 1253 1254 1256; in some examples to control parts or all of one or a plurality of TP displays 1256 1257; in some examples for other types of output control(s). In some examples various user I/O devices 1262 (including all forms of TP device inputs and outputs) may include their respective specialized control(s) interface(s) with their respective buttons, sliders, physical or digital knobs, connectors, widgets, etc. for utilizing each I/O device's controls by means such as in some examples selecting; in some examples finding; in some examples setting; in some examples utilizing defaults; in some examples utilizing presets; in some examples utilizing saved settings; in some examples utilizing templates; in some examples utilizing style sheets and/or styles; in some examples utilizing or adapting previous settings from the same or similar inputs; in some examples utilizing or adapting previous settings from similar types of inputs; etc. In some examples a controls interface 1250 detects the current state(s)

of the respective controls, including any changes in a control, and outputs said state data to the CPU 1266 by means of the system bus 1260.

In some examples said TP device outputs one or a plurality of unprocessed and/or synthesized video/audio streams at various processing steps to use in setting various controls, or to use directly; in some examples said TP device is controlled to output a single selected and unprocessed input video from the various inputs received; in some examples said TP device is controlled to output a grid display of selected unprocessed input videos from some or all of the inputs received; in some examples said TP device is controlled to output a combination of a single selected and unprocessed input video that is displayed in a different size and style from a grid display of selected unprocessed input videos from some or all of the inputs received; in some examples said TP device is controlled to output a preview of a synthesized combination of input videos, along with dynamically altering said synthesis as varying controls are applied; in some examples said TP device is controlled to output a preview of a synthesized combination of input videos, along with the selected and unprocessed input videos from which the synthesis is performed, along with dynamically altering said synthesis as varying controls are applied to each individual input video or to the synthesized preview of combined input videos; etc. In some examples said TP device is controlled to save particular combinations of controls to apply said saved combinations automatically to control input sources; to control types of input sources individually; to control categories of input sources as a class of inputs; to control combinations of input sources as a group of multiple specific input sources, types of input sources, categories of input sources, classes of input sources, previously combined input sources, etc. In some examples said TP device may automatically perform input, format conversion, control, synthesis, output and display with manual control at any time to specify functions such as input selection(s), combination(s) desired, mixing controls, effects, output(s), display(s), etc.

Various processes in a mixed format TP device depend on video signals for synchronization such as in some examples switching or combining a plurality of inputs from a plurality of sources; in some examples for video mixing; in some examples for video effects; in some examples for video output(s); etc. The timer/sync generator 1255 in a TP device may in some examples be a video signal generator (VSG), in some examples a sync pulse generator (SPG), in some examples a test signal generator, in some examples a VITS (vertical interval test signal) inserter, or another known type of timer/sync generator. In some examples a timer/sync generator 1255 counts time intervals to generate tempo clock pulses 1255 that are employed to synchronize at the same timing in some examples the varying plurality of external inputs 1230 1231 1232 1233 that are received by means of network interfaces 1235 1236 1237 1238; in some examples one or a plurality of local user I/O inputs 1262 1261 or outputs 1262 1261; in some examples converting 1240; in some examples switching inputs 1246 1247; in some examples synthesis 1245 such as mixing 1248 and/or effects 1249; in some examples various locally stored inputs 1263 such as recordings; in some examples other inputs such as advertising, content, objects, music, audio, etc. as described elsewhere; in some examples during output 1252 1253 1254 1256; in some examples for other types of synchronization. In some examples such tempo clock pulses 1255 may be employed by the CPU 1265 1266, and/or by co-processors 1272 1273 for processing timing, in some examples for timing instructions, in some examples for interrupt instructions, or for other types of synchronization processes; and in some examples said CPU 1265 1266 and/or said co-processors 1272 1273 control components of the TD device such as in some examples external inputs 1230 1231 1232 1233; in some examples local user interface inputs 1262 1261; in some examples during mixing 1248, effects 1249 and overall synthesis 1245; in some examples stored inputs 1263; in some examples other inputs; in some examples during output 1252 1253 1254 1256; in some examples for other types of synchronization.

In some examples synthesis includes at least inputs/sync 1246; (optional) manual and/or automated designation of one or a plurality of combinations of inputs 1247; (optional) mixing 1248 said designated combinations 1247; adding (optional) effects 1249 to said designated combinations 1247; (optional) combination(s) of mixing 1248 and effects 1249 to said designated combinations 1247; and altering any of these combinations 1247, mixing 1248, effects 1249 at any step or stage by means of various automated and/or manual controls 1250. Said automated and/or controlled synthesis 1245 1246 1247 1248 1249 1250 begins with inputs/sync 1246 such as in some examples format conversion such as described in 1151 1152 1153 in FIG. 29, but at this step 1246 confirms and/or validates that the respective inputs 1230 1231 1232 1233 1262 as received and processed by the TP device 1235 1236 1237 1238 1239 1240 1241 1242 1243 are appropriately prepared and synchronized for TP device uses such as synthesis 1245 such as in some examples A/D or other format conversion 1240, in some examples timing sync 1255, in some examples other types of synchronization. In some examples inputs 1230 1231 1232 1233 are received by a TP device 1235, converted for use 1240, synthesized 1245 and controlled 1245 1250, then output 1252 with each frame stored in memory 1264, and the succession of processed and stored frames in memory 1264 output and displayed 1252 as a new synthesized video with both format 1253 and timing 1255 synchronized for display 1256 1257.

In some examples any of these inputs 1230 1231 1232 1233 and/or steps such as in some examples as received 1235, in some examples as converted for TP device use 1240, in some examples at various steps or stages of synthesis 1245, in some examples at various steps or stages of display 1252 may be displayed under automated and/or user control 1250 to a local user in some examples, to a remote user in some examples, or to an audience in some examples. In some examples a range of user controls 1250 and features may be utilized at various steps 1235 1240 1245 1252 such as changing the combination of inputs 1250 1246 1247, zooming in or out 1250 1256, changing the background 1250 1248, changing components of a background 1250 1248, inserting titles or captions 1250 1248 1249, inserting an advertisement(s) 1250 1248 1249, inserting content 1250 1248 1249, changing objects in the background 1250 1248 1249, etc.

In some examples mixing 1248 may be performed under automated and/or user control 1250 such as in some examples a video editing system 1250 1248 that includes two or a plurality of inputs 1230 1231 1232 1233 1262. In some examples an input is a background such as a place 1231 1246; in some examples an input is a local identity such as a user 1262 1246; in some examples an input is a remote identity such as an SPLS member 1230 in a focused connection 1232 1246; in some examples an input is a remotely stored advertisement 1231 1246; in some examples an input is a broadcast program 1233 1246; in some examples an input is a streaming media source 1233 1246; and in some examples another type of input may be used 1231 1246 as described elsewhere. In some examples mixing includes separating an input's 1246 foreground object(s) from its background as described elsewhere such as in FIG. 81 through 85. In some examples mixing 1248 combines these inputs by means of known video mixing technology (as described elsewhere) to synthesize and create a local display 1256 1257 of said remote identity 1230 1232 positioned appropriately in an optionally selected place 1231 with an optionally inserted advertisement 1231 positioned appropriately in the background 1231, as well as to simultaneously synthesize and create a remote display 1256 1235 1232 of said local user 1262 positioned appropriately in said place 1231 with said advertisement 1231 positioned appropriately in the background place 1231. In some examples mixing 1248 combines these inputs by means of known video mixing technology (as described elsewhere) to synthesize and create a local display 1256 1257 of said remote identity 1230 1232 positioned appropriately in an optionally selected broadcast program 1233 or streaming media 1233 with an optionally inserted advertisement 1231 positioned appropriately in the background 1231, as well as to simultaneously synthesize and create a remote display 1256 1235 1232 of said local user 1262 positioned appropriately in said place 1231 with said advertisement 1231 positioned appropriately in the broadcast program 1233 or streaming media 1233. In some examples other inputs 1246 1247 may be mixed 1248 into the new synthesis 1245 dynamically whether automatically or under user control 1250 with various interface controls 1250 such as in some examples designators 1247 to determine which input(s) is added, and in some examples sliders 1250 to control the relative strength of the added input 1246 so that it is an appropriate fit into the current mixed output 1248, to yield differently synthesized and created video output(s) 1252. In some examples a user may see that one input component 1246 such as the participant from a remote focused connection 1232 blends too much into the background so the user may select that designated input 1250 1247 and increase its intensity 1248 (such as by a gain slider in some examples, changing a color[s] in some examples, or altering one or a plurality of other attributes such as size or position in some examples) to readily increase its visibility in the mixed 1248 output 1252. In some examples this may be accomplished by simply varying the synthesis ratio 1248 between the designated inputs 1247 so that one or a plurality of inputs becomes more outstanding in the output 1252. In some examples other controls 1250 may be used to automatically and/or manually adjust attributes in real time one or a plurality of inputs 1246 1247 and/or the mixed 1248 output 1252; such as color differences in some examples, hue in some examples, tint in some examples, color(s) in some examples, transparency in some examples, and/or other attributes in other examples. In some examples it is possible for a TP device to utilize said mixing 1248 1250 to simultaneously create multiple new synthesized videos in real-time as described elsewhere such as in FIG. 33.

In some examples effects 1249 may be added under automated and/or user control 1250 such as in some examples changing the size of a dimension(s) of a designated input 1249 1246 1247 such as an overall size in some examples, a vertical dimension in some examples, a horizontal dimension in some examples, a cropping or zoom in some examples; in some examples changing the position(s) of one or a plurality of designated inputs 1249 1246 1247; in some examples changing the hue of one or a plurality of designated inputs 1249 1246 1247; in some examples changing the tint of one or a plurality of designated inputs 1249 1246 1247; in some examples changing the luminance of one or a plurality of designated inputs 1249 1246 1247; in some examples changing the gain of one or a plurality of designated inputs 1249 1246 1247; in some examples changing the transparency of one or a plurality of designated inputs 1249 1246 1247; in some examples changing the color difference of one or a plurality of designated inputs 1249 1246 1247; in some examples simultaneously changing multiple values or attributes of one or a plurality of designated inputs 1249 1246 1247; in some examples adding a border to one or a plurality of designated inputs 1249 1246 1247; in some examples altering one or a plurality of persons 1249 such as adding a beard in some examples, changing the hairstyle in some examples, changing hair color in some examples, adding glasses in some examples, changing the color of one or a plurality of clothing items in some examples, etc. In some examples it is possible for a TP device to utilize said effects 1249 1250 to simultaneously create multiple new synthesized videos in real-time as described elsewhere such as in FIG. 33. In some examples it is possible for a TP device to utilize both said mixing 1248 1250 and said effects 1249 1250 to simultaneously create multiple new synthesized videos in real-time as described elsewhere such as in FIG. 33.

While the TP device processing flow 1235 1240 1245 1252 1260 1261 1262 1263 1264 1265 1272 1277 has been described primarily in terms of video synthesis, in some examples each of these steps simultaneously processes audio with the respective video such that pictures and sound are appropriately synchronized during receiving 1235 in some examples, conversion 1240 in some examples, synthesis 1245 in some examples, control 1250 in some examples, output and display 1252 1256 1257 in some examples, and network communication of said output 1235 in some examples. In some examples the inputs 1246 are directly output 1252; in some examples the mixed 1248 combinations 1247 are output 1252; in some examples the mixed 1248 combinations 1247 with added effects 1249 are output 1252; in some examples the inputs 1246 with added effects 1249 are output 1252; in some examples other picture processing may be performed as directed by automated and/or manual controls 1250 then output 1252.

While the TP device processing flow 1235 1240 1245 1252 1260 1261 1262 1263 1264 1265 1272 1277 has been described primarily in terms of video synthesis, in some examples each of these steps separately processes audio from the respective video but then recombines video and audio during specific steps such as compositing in some examples, such that pictures and sound are appropriately synchronized during receiving 1235 in some examples, conversion 1240 in some examples, synthesis 1245 in some examples, control 1250 in some examples, output and display 1252 1256 1257 in some examples, and network communication of said output 1235 in some examples.

Output 1252 comprises components that in some examples includes media switch(es) 1254, in some examples includes (optional) format conversion 1253, in some examples includes one or a plurality of display processors 1256, in some examples includes one or a plurality of BOC's (Broadcast Output Components) 1256 which operate analogously to the output functions of a PC TV tuner card that includes two or more separate tuners on one card, and in some examples includes one or a plurality of displays 1257. In some examples a timer/sync generator 1255 is utilized to synchronize output 1252 1253 1254 as described elsewhere. In some examples one or a plurality of media switches 1254 routes a synthesized real-time video 1245 to a plurality of simultaneous uses such as in some examples a local display 1257; in some examples a simultaneous focused connection 1232 with one or a plurality of remote participants connected by means of a network interface 1235; in some examples a simultaneous focused connection with a plurality of remote IPTR 1232 1231 connected by means of one or a plurality of network interfaces 1235; in some examples output a local playback 1256 1257 and/or transmit a broadcast 1235 1233 of one or a plurality of recorded and/or live programs; in some examples simultaneously recording said synthesized video 1245 to local storage 1263 and/or to remote storage 1263; in some examples a simultaneous broadcast of said synthesized video 1245 to an audience by means of one or a plurality of network interfaces 1235 1236 1237 1238 1239; in some examples for other singular or simultaneous uses of said synthesized video 1245. In some examples one or a plurality of external TP devices (such as in some examples RCTP, in some examples AIDs/AODs, in some examples VTP's, in some examples other types of TP connections) may also provide said media switch 1254 with their synthesized output (s) 1245, and the plurality of uses of their synthesized video 1245 may be visible in some examples, or in some examples said media switch 1254 may provide routing of the external TP device's synthesized video 1245 but the distributed uses are not visible to the external TP device. In some examples of media switches 1254 one or a plurality of synthesized videos 1245 may simultaneously be input from one or a plurality of TP devices, and then be output for a plurality of purposes and connections that include in some examples real-time uses, in some examples recordings for asynchronous and/or on-demand uses at a different times, and in some examples be output for other simultaneous uses. In some examples said media switch(es) 1254 may provide built-in format conversion, and in some examples said media switch(es) 1254 may route one or a plurality of synthesized videos for separate (optional) format conversion 1253 as needed by each video. In some examples said media switch(es) 1254 may utilize timing signals 1255 in the event two or a plurality of inputs require synchronization. Therefore, in some examples said media switching 1254 is provided by one or a plurality of media switch(es) 1254 which in some examples has scalable capacity and intelligence, and in some examples combining multiple switching and format conversion functions into a TP device reduces lags and latencies, and in some examples providing multiple media switches within a TP device reduces lags and latencies.

In some examples said media switch 1254 includes one or a scalable plurality of parsers 1254, one or a scalable plurality of DMA (Direct Memory Access) engines 1254, and one or a scalable plurality of memory buffers that in some examples are components of the media switch 1254 and in some examples are in memory 1264. In some examples a media switch(es) includes explicit DMA engines 1254 such as in some examples one or a plurality of video DMA engines 1254; in some examples one or a plurality of audio DMA engines 1254; in some examples one or a plurality of event DMA engines 1254; in some examples one or a plurality of private and/or secret DMA engines 1254; in some examples one or a plurality of other types of DMA engines 1254. In logical sequence, the inputs to said media switch 1254 include synthesis 1245 in some examples; other inputs such as external IPTR or TP devices 1235 1240 1245 that may be passed through the TP device to the media switch with no processing in some examples, some processing in some examples, and a plurality of processing steps in some examples; and timing synchronization 1255 that may be utilized in some examples and ignored in some examples. In some examples a parser 1254 parses each input to determine its key components such as the start of all frames; in some examples a parser 1254 parses each input to associate it with periodic timed pulses 1255; in some examples a parser 1254 parses each input to identify and utilize a time code or other attribute that is part of said input. In some examples the parsing process divides each input into its component structure so that each component may be processed individually, and various types of component structure(s) and/or indicators are known and may be utilized by said parser. As an input stream is received by a parser 1254 it is parsed for its components such as each frame in some examples; in some examples when the parser finds the start of a component it directs that stream to a DMA engine 1254 which streams said input to a memory buffer location 1254 1264 until the next component is identified by said parser 1254 and streamed into its memory buffer location 1254 1264. In some examples the memory buffer location of each component is provided to the media switch's program logic 1254 via an interrupt mechanism such that the program logic knows where each memory buffer location starts and ends. In some examples the program logic 1254 stores accumulated memory buffers locations to generate a set of logical segments that is divided and packaged in various formats to correspond to each type of output required; in some examples the program logic constructs a focused connection stream 1232; in some examples the program logic constructs one or more types of PTR stream(s) 1231; in some examples the program logic constructs a digital television stream as a broadcast source 1233 and 971 in FIG. 32; in some examples the program logic constructs an analog television stream as a broadcast source 1233 and 971 in FIG. 32; in some examples the program logic constructs a streaming media source 1233 and 971 in FIG. 32; in some examples the program logic constructs a stream suitable for recording and archiving for later editing and/or playback; in some examples the program logic constructs a stream appropriate for another use. In each of these and other examples the program logic 1254 converts the set of stored accumulated memory buffers locations into specific instructions to construct each type of output needed from a specific input, such as in some examples constructing a packet appropriate for the Internet that contains an appropriate set of components in logical order plus ancillary control data. In some examples the program logic 1254 queues up one DMA input/output transfer cycle then clears those associated memory buffers which limits the program steps, DMA transfers and memory buffers needed in part because this is a circular event cycle in which the number of parallel DMA transfers for each input is minimized by clearing each cycle when it is completed. This media switch component 1254 in some examples decouples the CPUs 1265 1272 from performing one or a plurality of output routing, packaging and streaming steps.

In some examples one or a plurality of multiplexers 1254 may be used instead of a media switch(es) 1254 to route a synthesized real-time video 1245 to a plurality of simultaneous uses such as in some examples a local display 1257; in some examples a simultaneous focused connection 1232 with one remote participant communicated by means of a network interface 1235; in some examples a simultaneous focused connection with a plurality of remote IPTR 1232 1231 communicated by means of one or a plurality of network interfaces 1235; in some examples simultaneously recording said synthesized video at 1245 to local storage 1263 and/or to remote storage 1263; in some examples a simultaneous broadcast 1233 of said synthesized video 1245 to an audience by means of one or a plurality of network interfaces 1235; in some examples for other simultaneous uses of said synthesized video 1245. In some examples this means that a single synthesized video 1245 may simultaneously serve multiple purposes and connections that include both real-time uses and recordings for asynchronous and/or on-demand uses at a different time, and require multiplexer 1254 routing of a single synthesized video 1245, with or without format conversion 1253, for each simultaneous use.

In some examples each type of output 1245 1254 is passed to other TP device components 1254, or in some examples to other TP device components 1253 1256, that may in turn further process that output such as in some examples adjusting output image(s) in response to input and processing from a device's viewer detection sensor(s) 1262, in some examples encoding it, in some examples formatting it for a particular use, in some examples displaying it locally, etc. Therefore, a scalable media switch(s) 1254 receives one or a plurality of inputs 1235 1240 1245 and in some examples converts each input into one or a plurality of appropriately formatted outputs to fit a plurality of uses, or in some examples passes said outputs to successive TP device components 1256 1257 1235. In some examples a media switch 1254 or format conversion 1253 performs additional processing such as encoding using VBR (Variable Bit Rate) or in some examples another format. In some examples VBR reduces the data in successive frames by encoding movement and more complex segments at a higher bit rate than less complex segments, such as a blank wall requiring less space and bandwidth then a colorful garden on a windy day. Numerous formats may optionally be VBR encoded including in some examples MPEG-2 video; in some examples MPEG-4 Part 2 video; in some examples H.264 video; in some examples audio formats such as MP3, AAC, WMA, etc.; and in some examples other video and audio formats.

In some examples a single synthesized real-time video 1245 is created by in some examples designating inputs 1247, in some examples mixing 1248, in some examples adding effects 1249, in some examples previewing the output(s) in real time 1256 1257 and applying controls 1250, and in some examples other synthesis steps as described elsewhere. In some examples said synthesized video 1245 requires format conversion 1253 such as in some examples NTSC encoding 1253 to create a composite signal from component video picture signals. In some examples said synthesized video 1245 does not require format conversion 1253 and may be passed directly from synthesis 1245 to in some examples a media switch(es) 1254, in some examples to display processing 1256, in some examples to a network interface 1235, and in some examples to another use as described elsewhere. In some examples (optional) format conversion 1253 is performed automatically based on the type of use(s) or display(s) in use by each TP device 1140 in FIG. 29 such as in some examples to fit an SDI (Serial Digital Interface) interface as used in broadcasting; in some examples composite video; in some examples component video; in some examples to conform to a standard such as the various SMPTE (Society of Motion Picture and Television Engineers) standards; in some examples to conform to ITU-Recommendation BT.709 for high definition televisions with a 16:9 aspect ratio (widescreen); in some examples to conform to HDMI; in some examples to conform to specific pixel counts such as in various examples 640×480 (VGA), 800×600 (SVGA), 1024×768 (XGA), 1280×1024 (SXGA), 1600×1200 resolution (UXGA), 1400×1050 (SXGA+), 1280×720 (WXGA), 1600×768/750 (UWXGA), 1680×1050 (WSXGA+), 1920×1200 (WUXGA). 2560×1600 (WQXGA), 3280×2048 (WQSXGA), 480i (NTSC television), 576i (PAL television), 480p (720×480 progressive scan television), 576p (720×576 progressive scan television), 720p (1280×720 progressive scan high definition television), 1080i (1920×1080 high definition television), 1080p (1920×1080 progressive scan high definition television), and other pixel counts and display resolutions such as for various cell phones, e-tablets, e-pads, net books, etc.

In addition to formatting for displays (optional) format conversion 1253 may be performed in some examples for video compression to reduce bandwidth for transmission in some examples on one or a plurality of networks, in some examples for broadcast(s), in some examples for a cable television service, and some examples for a satellite television service, or in some examples for another type of bandwidth reduction need. In some examples (optional) compression 1253 is performed automatically based on the type of network, application, etc. that is being utilized such as in some examples H.261 (commonly used in videoconferencing, video telephony, etc.); in some examples MPEG-1 (commonly used in video CDs); in some examples H.262/MPEG-2 (commonly used in DVD video, Blu-Ray, digital video broadcasting, SVCD); in some examples H.263 (commonly used in videoconferencing, videotelephony, video on mobile phones [3GP]); in some examples MPEG-4 (commonly used on video on the Internet [DivX, Xvid, . . . ); in some examples H.264/MPEG-4 AVC (commonly used in Blu-Ray, digital video broadcasting, iPod video, HD DVD); in some examples VC-1 (the SMPTE 421M video standard); in some examples VBR as described elsewhere, and in some examples other types of video compression and/or standards.

In some examples one or a plurality of display processors components 1256 (also known as a GPU[s] or Graphics Processing Unit[s], which may also encompass a BOC[s] or Broadcast Output Component[s] that operates analogously to the output functions of a PC TV tuner card that includes two or more separate tuners on one card) receives said inputs and/or output(s) 1235 1240 1245 1254 1253 and utilizes a specialized processor that accelerates graphics rendering such as for displaying a plurality of simultaneous output streams in some examples, for 3-D rendering in some examples; for high definition video in some examples; for supporting multiple simultaneous displays in some examples; for 2-D acceleration in some examples; for GPU assisted video encoding or decoding in some examples; for adding overlays such as controls and icons to some displays in some examples; for specialized features such as resolution conversions, filter processing, color corrections, etc. in some examples; for encryption prior to transmission in some examples; or for other display-related functions. In some examples a display processor(s) is a separate component(s) in some examples such as a video card, a GPU, video BIOS, video memory, etc.; in some examples one or a plurality of display outputs include VGA (Video Graphics Array), DVI (Digital Visual Interface), HDMI (High Definition Multimedia Interface), composite video, component video, S-video, DisplayPort, etc. In some examples a display processor(s) is an integrated component such as on a motherboard in which a graphics chipset provides display processing, but may or may not have lower performance than a separate display processor(s) component. In some examples a plurality of display processors are utilized to display a single image or video stream; in some examples a plurality of display processors are utilized to display multiple video streams; in some examples one or a plurality of display processors are utilized as general purpose graphics processors that provide stream processing, which in some examples adds a GPU's floating-point computational capacity to a TP device's processing capacity 1266 1273.

In some examples a TP display 1257 visually displays any of the range of selected video such as in some examples video after synthesis 1245; in some examples video after mixing

1248; in some examples video after effects 1249; in some examples video after format conversion 1253; in some examples a direct display of a broadcast(s) received 1233, in some examples a received broadcast 1233 after conversion 1241; in some examples video and audio after any combination of synthesis 1245, mixing 1248, effects 1249, conversion 1253, etc.; in some examples one or a plurality of unprocessed inputs 1230 1231 1232 1233; in some examples one or a plurality of user I/O 1262; in some examples partially processed video during synthesis 1245; in some examples stored video/audio from local storage 1263 and/or remote storage 1263; in some examples other video data from any of a range of extensible sources. In some examples a local TP display device 1257 may be any form of display such as in some examples an LCD (Liquid Crystal Display); in some examples a plasma screen; in some examples a projector; in some examples any other form of display. In some examples a TP device's output 1252 is processed 1256 as described elsewhere, and output to one or a plurality of network interfaces 1235 1236 1237 1238 1239 for transmission over a network for remote display such as in some examples with SPLS members 1 through N 1230, in some examples with PTR 1 through N, in some examples with focused connections 1 through N 1232, in some examples with one or a plurality of broadcast sources 1233, in some examples with one or a plurality of TP devices, in some examples with one or a plurality of AIDs/AODs, in some examples with one or a plurality of RCTP devices, and in some examples with any of an extensible range of devices.

In some examples a display presents TP device output that in some examples includes a consistent TP interface as described elsewhere; in some examples includes video; in some examples includes audio; in some examples includes icons; in some examples includes 3-D; in some examples includes features for tactile interactions; in some examples includes haptic features; in some examples includes visual screens; in some examples includes e-paper; in some examples includes wearable displays such as headsets; in some examples includes portable wireless pads; in some examples includes analog monitors; in some examples include digital monitors; in some examples includes multiple simultaneous types of wired and wireless display devices; etc. In some examples display devices are interactive and provide TP input such as in some examples touch interface displays; in some examples haptic displays (which rely on the user's sense of touch by including motion, forces, vibrations, etc. as stimulation in some examples, content in some examples, interaction in some examples, feedback in some examples, means for input in some examples, and other interactive uses); in some examples a headset that includes one or two earpieces and a microphone for voice input; in some examples wearable devices such as a portable projector; in some examples projected interactive objects such as a projected keyboard; etc. In some examples displays include a CRT; in some examples a flat-panel display; in some examples an LED (Light Emitting Diode) display; in some examples a plasma display panel; in some examples an LCD (Liquid Crystal Display) display; in some examples an OLED (Organic Light Emitting Diode) display; in some examples a head-mounted display; in some examples a video projector display; in some examples an LCD projector display; in some examples a laser display (sometimes known as a laser projector display); in some examples a holographic display; in some examples an SED (Surface Conduction Electron Emitter Display) display; in some examples a 3-D display; in some examples an eidophor front projection display; in some examples a shadow mask CRT; in some examples an aperture grille CRT; in some examples a monochrome CRT; in some examples a DLP (Digital Light Processing) display; in some examples an LCoS (Liquid Crystal on Silicon) display; in some examples a VRD (Virtual Retinal Display) or RSD (Retinal Scan Display, used in some types of virtual reality); or in some examples another type of display.

In some examples of TP devices multiple displays are present; in some examples two or a plurality of displays are cloned so that each receives a duplicate signal of the same display; in some examples two or a plurality of displays share a single spanned display that is extended across the multiple displays with a result of one large space that is one contiguous area in which objects and components may be moved between (or in some examples shared between two or more of) the various displays. In some examples multiple display processor units (also known as GPU's or Graphics Processing Units) 1256 may be used to enable a larger number of displays to create one single unified display. In some examples of TP devices larger displays may be employed such as in some examples LCD (Liquid Crystal Display) displays; in some examples PDP (plasma) displays; in some examples DLP (Digital Light Processing) displays; in some examples SED (Surface Conduction Electron Emitter Display) displays; in some examples FED (Field Emission Display) displays; in some examples projectors of various types (such as for examples front projections and rear projections); in some examples LPD (Laser Phosphor Display) displays; and in some examples other types of large screen technology displays.

In some examples programs to be executed 1267 1268 1274 1275 by the CPU 1266 and/or by a co-processor(s) 1273 in some examples are stored in local storage 1263, in some examples are stored in remote storage 1263, in some examples are stored in ROM memory 1264, and in some examples are stored in another form of storage 1263 or memory 1264. As described elsewhere (such as in FIG. 29) the program(s), module(s), component(s), instructions, program data, user profile(s) data, IPTR data, etc. that enable operation of a TP device may be stored in local storage and/or remote storage and retrieved as needed to operate said TP device. Additionally, storage 1263 in FIG. 31 enables storage and retrieval of the automated settings and/or manual controls settings 1250 that are employed in some examples in one or a plurality of mixing steps 1248, in some examples in applying one or a plurality of effects 1249, in some examples in one or a plurality of format conversions 1240 1241 1242 1243 1253, in some examples in one or a plurality of uses of timing or sync signals 1255, in some examples in one or a plurality of displays 1256 1257, in some examples in one or a plurality of network communications 1235 1236 1237 1238 1239, in some examples in other stored settings and/or controls. These pre-set stored settings and/or controls settings may be in the form of video output types, video styles, configurations, templates, style sheets, etc. At predetermined steps, such as in some examples when inputs 1246 have been designated 1247 and output formats are known 1253 including their display(s) 1256 1257, said local storage 1263 and/or remote storage 1263 may be accessed to retrieve the appropriate automated settings and/or appropriate defaults controls settings 1250 so that the CPU 1265 1266 and/or co-processors 1272 1273 may operate properly to perform the respective operations 1248 1249 1240 1253 1255 1256 1235 etc. The local storage 1263 and/or remote storage 1263 may employ any fixed media such as hard disks, flash (semiconductor) memory, etc. and/or removable media such as recordable CD-R and CD-RW, DVD-R, magneto optical (MO) discs, etc. In some examples this enables a plurality of pre-set synthesis patterns to be stored as a network resource for a plurality of users to retrieve whenever needed, whether these are retrieved individually or a collection(s) is downloaded to local storage for local retrieval. As needed, one or a plurality of pre-set synthesis patterns may be immediately retrieved and applied such as in a one-touch operation, which in some examples enables prompt and immediate switches between different types of mixes 1248, in some examples different effects 1249, in some examples different display arrangement patterns 1256 1257 1262, in some examples any other pre-set and stored immediate transformations or component settings.

In some examples RAM memory 1264 is utilized as working memory by the CPU 1266 and/or by a co-processor(s) 1273 to store various program logic 1267 1274 in some examples; scheduled operations 1268 1275 in some examples; lists 1269 1276 in some examples; queues 1269 1276 in some examples; counters 1269 1276 in some examples; and data 1235 1240 1245 1252 in some examples as said processors execute various programs 1267 1268 1274 1275. In some examples RAM memory 1264 is utilized as working memory for storing various inputs 1230 1231 1232 1233 1262 as they are undergoing various TP device processes under program control such as in some examples conversion 1240, in some examples synthesis 1245 and in some examples output 1252.

In some examples a TP device includes considerable processing power as would be expected for devices that provide and support "digital presence" as described elsewhere. Just as a contemporary laptop with an advanced multi-core processor has more processing power than a previous generation's mainframe computer, in some examples said continuously advancing processing power includes one or a plurality of supervisor CPUs 1265 1266, and in some examples said processing includes one or a plurality of co-processors 1272 1273 that are selectable by the supervisor CPU(s) 1266. In some examples said co-processors 1272 are connected via a bus 1260 to the supervisor CPU 1266, with said co-processors including video co-processors in some examples, audio co-processors in some examples, and graphics co-processors (such as GPUs) in some examples. In some examples a supervisor memory 1264 is connected to the supervisor CPU 1266 directly, and in some examples connected via a bus 1260. In some examples one or a plurality of co-processor memories 1264 is connected to a co-processor(s) 1266 directly, and in some examples connected via a bus 1260. In some examples memory 1264 may be dynamically utilized as required as either or both supervisor CPU memory 1264 1265 1266, co-processor memory 1264 1272 1273, data processing memory 1264 1265 1266 1272 1273, media switching memory 1264 1254, or another memory use. In some examples a supervisor application 1267 selectively assigns video inputs 1235, format conversion 1240, synthesis 1245, outputs 1252, etc. to one or a plurality of co-processors 1273 and co-processors' applications 1274. In some examples a supervisor application 1267 includes processing scheduling 1268 with in some examples associated lists 1269, in some examples queues 1269, in some examples counters 1269, etc. In some examples a supervisor application 1267 includes co-processing scheduling 1268 1275 with in some examples associated co-processor lists 1269 1276, in some examples co-processor queues 1269 1276, in some examples co-processor counters 1269 1276, etc. In some examples a supervisor application 1267 provides instructions to one or a plurality of co-processors' 1273 applications 1274 that in some examples include associated lists 1276, in some examples include associated queues 1276, in some examples include associated counters 1276, etc. In some examples said supervisor memory 1264 stores segments of one or a plurality of video streams for assignment to a selected co-processor 1273 and/or a selected co-processor application(s) 1274. In some examples said supervisor processor 1266 or selected co-processor(s) 1273 performs selectively instructed processing of video inputs 1235, in some examples format conversion 1240, in some examples synthesis 1245, in some examples outputs 1252, etc. In some examples said memory 1264 stores segments of one or a plurality of video streams as processed by said supervisor processor 1266 or in some examples selected co-processor(s) 1273. In some examples as co-processors 1273 utilize application logic 1274 to complete each scheduled 1275 1276 step, said supervisor application 1267 dynamically updates said lists 1269, said queues 1269, said counters 1269, etc. producing a cycle in which said supervisor application logic 1267 dynamically re-schedules co-processors 1273 for appropriate subsequent TP processing steps 1235 1240 1245 1252. In some examples controls 1250 dynamically alter supervisor application 1267 instructions, schedule(s) 1268, lists 1269, queues 1269, counters 1269, etc. In some examples controls 1250 dynamically alter co-processor applications 1274 instructions, schedule(s) 1275, lists 1276, queues 1276, counters 1276, etc. In some examples automated controls such as from making new focused connections 1232, in some examples adding PTR to a focused connection 1231, in some examples displaying a selected broadcast 1233, or in some examples other user actions or TP device processing steps that dynamically alter supervisor application 1267 instructions, schedule(s) 1268, lists 1269, queues 1269, counters 1269, etc. In some examples automated controls such as from making new focused connections 1232, in some examples adding PTR to a focused connection 1231, in some examples displaying a selected broadcast 1233, or in some examples other user actions or TP device processing steps that dynamically alter co-processor applications 1274 instructions, schedule(s) 1275, lists 1276, queues 1276, counters 1276, etc. In some examples the number of co-processors 1273 is selected by the supervisor application 1267 in some examples, by the processing scheduler 1268 in some examples, or by other means in some examples. In some examples the number of video streams processed by each co-processor 1273 is selected by the supervisor application 1267 in some examples, by the processing scheduler 1268 in some examples, or by other means in some examples. In some examples the number and range of outputs 1252 processed by each co-processor 1273 is selected by the supervisor application 1267 in some examples, by the processing scheduler 1268 in some examples, or by other means in some examples.

TP device processing of broadcasts: In some examples it is an object of a Teleportal device to provide direct access to a converged digital environment with a single digital device and user interface. In some examples Teleportals comprise electronic devices under user control that may be used to watch one or a plurality of current broadcasts from various television, radio, Internet, Teleportals and other sources 971 on one or a plurality of Teleportals 974 973; and in some examples Teleportals may be used to record one or a plurality of broadcasts for later viewing; and in some examples Teleportals may be used to blend current and recorded broadcasts into synthesized constructs and communications as described elsewhere; and in some examples Teleportals may be used to communicate interactively with one or a plurality of current or recorded broadcasts and/or syntheses to other viewers; and in some examples Teleportals may be used for other uses of broadcasts as described herein and elsewhere. In addition, a Teleportal device may be used for other functions simultaneously while watching one or a plurality of broadcasts.

Therefore, in some examples it is an object of a Teleportal device to reduce the need for one or a plurality of separate television sets; in some examples it is an object of a Teleportal device to reduce the need for one or a plurality of separate free broadcast and/or paid subscription services (such as cable or satellite television); and/or in some examples it is an object of a Teleportal device to reduce the need for one or a plurality of set-top boxes to provide separate decoding and use of broadcast sources.

FIG. 32, "TP Device Processing of Broadcasts," provides some examples in which broadcast sources 971 may be watched and/or listened to on Teleportal devices or used by Teleportal devices, making a TP device a substitute for the combination of a television set, a set-top box and/or a subscription broadcast service, plus providing other Teleportal functions as described elsewhere such as recording in some examples, playback in some examples, broadcasting in some examples, etc. In some examples broadcast sources 971 include cable television (herein TV) 971; in some examples satellite TV 971; in some examples over-the-air TV 971; in some examples IPTV 971 (Internet Protocol Television); in some examples TPTV 971 973 (Teleportal Television broadcasting) such as from other TP devices or users; in some examples Internet Radio 971 (also known as web radio); in some examples streaming media 971 (including short videos, webcasts, etc.) received from a telecommunications network; in some examples Web TV 971 or Internet TV 971; in some examples other types of broadcast sources 971 and broadcasts 971. In some examples broadcast sources 971 973 may be located at any program or broadcast distribution facility 971 973; in some examples a cable system head end 971 973; in some examples a satellite broadcast distribution facility 971 973; in some examples a data center containing media servers 971 973; in some examples an Internet hosting service 971 973; in some examples a "cloud" service 971 973; in some examples an individual's Teleportal device(s) 973; or in some examples any suitable broadcast distribution device or facility. In some examples a "local broadcast source" includes a local device source as described elsewhere such as in some examples a DVD player; in some examples a CD player; in some examples a Blu-ray player; in some examples a VCR; in some examples a directly connected digital camera; in some examples a directly connected camcorder; in some examples other types of media sources and/or players. In some examples remote broadcast sources 971 973 are received over one or a plurality of networks 972, while in some examples local broadcast sources include directly connected players and resources.

Watching, and/or listening, and/or using these may be accomplished in a TP device 974 by utilizing a subset of TP device components described in FIG. 31 and elsewhere. In some examples user control of said TP device 974 is performed by utilizing various user I/O devices 994 as described elsewhere, such as in some examples one or a plurality of remote controls 994; in some examples said TP device 974 is shared 995 and part or all of the TP device's functions are controlled by the remote user who is sharing it 995 and is therefore able to use it to watch broadcasts from a remote location; in some examples said TP device 974 is remotely controlled 995 and part or all of the TP device's functions are controlled by the remote user who is controlling it 995 and is therefore able to use it to watch broadcasts from a remote location; in some examples user control 994 995 is exercised by signals 994 995 that are received 997, processed 997 and utilized to control 997 982 976 said TP device's features and functions. In some examples TP device components include network interfaces 977; in some examples (optional) input tuner/format conversion 979; in some examples synthesis 981; in some examples controls 982 (such as in some examples switching a broadcast source 982 such as in some examples between a set top cable TV box and online IPTV; in some examples viewing one or more program guides 982; in some examples changing a television channel 982 for viewing the new channel; in some examples controlling the recording of a current or future broadcast 982; in some examples controlling the recording of a current communication session 982; in some examples using a current or recorded broadcast as input to synthesis 982; in some examples playing back a recording 982; or in some examples other controllable broadcast or recording/playback functions 982); in some examples (optional) output format conversion 985; in some examples a BOC 986 (Broadcast Output Component); in some examples display processing 987; in some examples playing a recording 989 in part or all of a TP device's display; in some examples playing a current broadcast 990 in part or all of a TP device's display; in some examples playing a processed synthesis 987 991 between a current broadcast or a recorded broadcast and other video and audio components; in some examples communicating, broadcasting or sharing said recording(s), broadcast(s) and synthesis(es) via a network 977 973; or in some examples performing other functions as described elsewhere.

In some examples a TP device includes user control 996 as described elsewhere that may receive signals from user I/O devices such as in some examples a keyboard 994; in some examples a keypad 994; in some examples a touchscreen 994; in some examples a mouse 994; in some examples a microphone and speaker for voice command interactions 994; in some examples one or a plurality of remote controls 994 of varying types and configurations; and in some examples other types of direct user controls 994. In some examples a device 974 may be shared 995 and the remote user(s) 995 who is sharing said device 974 provides user control 996 as described elsewhere; and in some examples a device 974 may be under remote control 995 and the remote user(s) 995 who is sharing said device 974 provides user control 996 as described elsewhere. Said user control 996 includes receiving said control signal(s) 994 995 997; processing 997 said received signal(s) as described in FIG. 35 and elsewhere; then controlling the appropriate function 982 976 or component 976 982 of said TP device 974. In some examples said received 997 and processed signals 997 are selectively transmitted to the TP device component 982 976 986 which in some examples controls functions such as choosing between various broadcast sources 971; in some examples displaying one or a plurality of interactive program guides 982; in some examples choosing a particular channel to watch 982; in some examples choosing a current broadcast 982 990 to watch; in some examples recording a particular broadcast 982 either currently or on a specific day and time; in some examples utilizing a current broadcast in synthesized communications 981; in some examples utilizing a recorded broadcast in synthesized communications 981; in some examples playing back a recorded broadcast 982 989 to watch it; in some examples playing back recordings 982 989 at scheduled dates and times and providing that as a TPTV (Teleportal Television) schedule for access by others 973; or in some examples performing another controllable function 982.

In the examples each step and its automated control and/or user control are known and will not be described in detail herein. In some examples said received broadcast is comprised of a broadcast stream (which may be in a multitude of formats such as in some examples NTSC [National Television Standards Committee], in some examples PAL [Phase Alternate Line], in some examples DBS [Digital Broadcast Services], in some examples DSS [Digital Satellite System], in some examples ATSC [Advanced Television Standards Committee], in some examples MPEG [Moving Pictures Experts Group], in some examples MPEG2 [MPEG2 Transport], or in some examples other known broadcast or streaming formats) and said (optional) tuner/format conversion 978 979 may disassemble said broadcast stream(s) to find programs within it and then demodulate and decode said broadcast stream according to each kind of format received. In some examples this may include an IF (Intermediate Frequency) demodulator that demodulates a TV signal at an intermediate frequency; in some examples this may include an A/D converter that may convert a TV signal into an analog or a digital signal; in some examples this may include a VSB (Vestigal Side Band) demodulator/decoder; in some examples a video decoder and an analog decoder respectively decode video and audio signals; in some examples a parser parses the stream to extract the important video and/or audio events (such as the start of frames, the start of sequence headers, etc. that device logic uses for functions such as in some examples playback, in some examples fast-forward, in some examples slow play, in some examples pause, in some examples reverse, in some examples fast-reverse, in some examples slow reverse, in some examples indexing, in some examples stop, or in some examples other functions); and/or in some examples other known types of decoder, converter or demodulator may be employed. Therefore, in some examples a sequence of two or a plurality of demodulators/decoders may be employed (for example, an ATSC signal may be converted into digital data by means of an IF demodulator, an A/D converter and a VSB demodulator/decoder; and for another example, an NTSC signal may be converted by means of a video decoder and an audio decoder), whereby said tuner/(optional) format conversion 979 tunes to a particular program within said broadcast sources 971 973, if needed provides appropriate format conversion 979, demodulation 979, decoding 979, parses said selected stream 979, and provides said appropriately formatted and parsed stream to the rest of the TP device.

In some examples after broadcast sources 971 973 are received 977 format conversion 979 is unnecessary, and the main controls employed 982 are to select a particular broadcast and pass it directly to output 984 985 986 to be watched 988 990. In some examples after broadcast sources 971 973 are received 977 format conversion 979 is performed, and the main controls employed 982 are to select a particular broadcast and pass it directly to output 984 985 986 to be watched 988 990. In some examples after broadcast sources 971 973 are received 977 and (optional) format conversion 979 is performed, the main controls employed 982 are to select a particular broadcast and pass it to the synthesis/controls functions 980 981 982 (as described elsewhere) in some examples for recording 981 982 (as described elsewhere); in some examples for synthesis 981 982 (as described elsewhere); in some examples to utilize other features 981 982 (as described elsewhere). In some examples output 984 includes (optional) format conversion 985 and said (optional) format conversion 985 may include encoding video 985 986 987 such as in some examples encoding video to display it 988 989 990 991 977 as described elsewhere; in some examples encoding a television signal 985 986 987 to display on a television; in some examples to encode video 985 986 987 such as for streaming 977 to fit a remote use or system. In some examples output 984 includes (optional) format conversion 985 and said (optional) format conversion 985 may include formatting audio signals for outputting audio in some examples to a speaker(s) 988; in some examples to an audio amplifier 988; in some examples to a home theater system 988; in some examples to a professional audio system 988; in some examples to a component of media 988 989 990 991 977; or in some examples to another form of audio playback 988. In some examples output 984 includes (optional) format conversion 985 and said (optional) format conversion 985 may include encoding video and audio such as in some examples to display it as a processed synthesis 987 991 as described elsewhere; in some examples encoding a television signal to display on a television; in some examples to encode video 985 986 987 such as for streaming 977 to fit a remote use or system.

Said functions and choices may be controlled in some examples by one or a plurality of users by means of user I/O devices 994; in some examples by one or a plurality of remote controls 994; in some examples a device 974 may be shared 995 and the remote user(s) 995 provides user control 996; and in some examples a device 974 may be under remote control 995 and the remote user(s) 995 provides user control 996. As an example if a user turns the volume up or down by using a remote control 994 996 997 the control function 982 adjusts the output of the audio function.

The above may be extended and expanded by data carried in the VBI (Vertical Blanking Interval) of analog television channels, or in a digital data track of digital television channels (a digital channel may include separate video, audio, VBI, program guide, and/or conditional access information as separate bitstreams, multiplexed into a composite stream that is modulated on a carrier signal; for example, in some examples digital channels transport VBI data to support analog video features, and in some examples a digital channel may provide additional digital data for other purposes). In some examples said additional data includes program associated data such as in some examples subtitles; in some examples text tracks; in some examples timecode; in some examples teletext; in some examples additional languages; in some examples additional video formats; in some examples music information tracks; in some examples additional data. In some examples said data includes other types and uses of additional data such as in some examples to distribute an interactive program guide(s); in some examples to download context-relevant supplemental content; in some examples to distribute advertising; in some examples to assist in providing meta-data enhanced programming; in some examples to assist in providing means for multimedia personalization; in some examples to assist in linking viewers with advertisers; in some examples to provide caption data; and/or in some examples to perform other data and assist with other functions. In some examples it is optional whether or not to play back or use all or any subset of said additional data when playing back or using said broadcast streams or programs that contain said additional data (whether in some examples encoded in the VBI, in some examples encoded in digital data track[s], in some examples provided by alternate means, or in some examples provided by additional means).

In some examples said additional data may be included according to standards such as in an NTSC signal utilizing the NABTS [North American Broadcast Teletext Standard]; in some examples according to FCC mandates for CC [Closed Caption] or EDS [Extended Data Services]; in some examples other standards or practices may be followed such as an MPEG2 private data channel. In some examples said additional data is not limited by standard means for encoding and decoding said data such as in some examples by modulation into lines of the VBI, and in some examples by a digital television multiplex signal that includes a private channel;

other appropriate and known ways may be used as well whether as alternates or additions to said standard means and in some examples said additional data may be directly communicated over a cable modem, in some examples may be communicated over a cellular telephone modem, in some examples may be communicated by a server over one or a plurality of networks, and in some examples any mechanism (s) that can transmit and receive digital information may be employed.

In some examples output 984 includes encoding and including various kinds of additional data 985 986 987 provided by the remainder of a TP device as described in this figure and elsewhere, such that said additional data is included in the output signal 984 988 990 991 977; and in some examples when said output is played back in a subsequent device's input said additional information may be used in various ways described herein and elsewhere (in some examples said additional data may include information such as the original source of a copyrighted program that has been used in synthesis and output; in some examples the date a synthesis was created and output; in some examples program title and description information for display in an electronic program guide; or in some examples other data included for other purposes and uses). Said output 984 may in some examples add data to a broadcast or a communication that goes beyond what is normally considered video and/or audio data.

One characteristic of TP devices is processing one or a plurality of simultaneous connections as described elsewhere. FIG. 33, "TP Device Processing—Multiple/Parallel," illustrates some examples of simultaneous processing of said connections in one device 1311 by means of a scalable plurality of simultaneous processes illustrated in FIG. 33. It also illustrates some examples of processing that is virtually integrated between two or a plurality of devices 1311 by means of a scalable plurality of simultaneous processes. In some examples simultaneous sources 1301 1301*a,b,c* . . . *n* that are processed include local I/O 1301, SPLS 1301, PTR 1301, focused connections 1301, broadcasts, and other sources as described elsewhere. In some examples said simultaneous sources 1301 1301*a,b,c* . . . *n* are received by simultaneous inputs 1302 1302*a,b,c* . . . *n* such as in some examples a network interface(s) 1303 as described elsewhere that includes in some examples simultaneous format conversion 1304 as described elsewhere. In some examples said source (s) 1301 1301*a,b,c* . . . *n* inputs 1302 1302*a,b,c* . . . *n* are simultaneously synthesized 1305 1305*a,b,c* . . . *n* by means such as in some examples designating inputs or channels 1306 as described elsewhere, in some examples mixing 1307 as described elsewhere, in some examples adding effects 1308 as described elsewhere, with (optional) user controls 1312 as described elsewhere. In some examples said simultaneous syntheses 1305 1305*a,b,c* . . . *n* are simultaneously output 1309 1309*a,b,c* . . . *n* by means such as outputs 1310 as described elsewhere, with simultaneous windows in a local device's displays 1314 1314*a,b,c* . . . *n* (that include audio as selected by a user), and/or with simultaneous windows in a remote device's displays 1314 1314*a,b,c* . . . *n* (that include audio as selected by a user), and/or simultaneous local and/or remote displays 1314 (that include audio as selected by a user) such as in some examples local display 1314, in some examples remote focused connections 1314, in some examples a stored recording(s) 1314, in some examples a broadcast program(s) 1314, and in some examples other outputs 1314 as described elsewhere.

In some examples inputs 1302 1302*a,b,c* . . . *n* 1303 includes for each simultaneously received source 1301 1301*a,b,c* . . . *n* that requires it, simultaneously performing format conversion 1304 as described elsewhere. In some examples automated controls 1312 and/or manual controls 1312 may be applied so that each individual format conversion 1304 operates in accordance with the settings of said controls 1312 so that each control setting corresponds to the appropriate source(s) 1301*a,b,c* . . . *n* as described elsewhere.

In some examples synthesis 1305 1305*a,b,c* . . . *n* includes for each simultaneously received source 1301 1301*a,b,c* . . . *n* that does not require format conversion 1304, and for each simultaneously format converted source 1304; in some examples automatically designating the appropriate sources 1306 for a specific synthesis 1305 1307 1308 and/or output 1309; and in some examples manually designating the appropriate sources 1306 for a specific synthesis 1305 1307 1308 and output 1309; and in some examples both automatically and/or manually designating the appropriate sources 1306 for a specific synthesis 1305 1307 1308 and output 1309. In some examples automated controls 1312 and/or manual controls 1312 may be applied so that each individual synthesis 1305 1305*a,b,c* . . . *n* 1306 1307 1308 operates in accordance with the settings of said controls 1312 so that each control setting corresponds in some examples to the appropriate synthesis 1305 1305*a,b,c* . . . *n* as described elsewhere; and in some examples to each synthesis step 1306 1307 1308 as described elsewhere. In some examples mixing 1307 includes automatically mixing 1307 designated sources 1306 as described elsewhere; and in some examples manually mixing 1307 designated sources 1306 as described elsewhere; and in some examples both automatically and manually mixing 1307 designated sources 1306 as described elsewhere. In some examples automated controls 1312 and/or manual controls 1312 may be applied so that each individual mixing 1307 of each set of designated sources 1306 operates in accordance with the settings of said controls 1312 as described elsewhere; and in some examples to each mixing step 1307 as described elsewhere. In some examples adding one or a plurality of effects 1308 includes automatically adding said effect(s) as described elsewhere; and in some examples manually adding said effect(s) as described elsewhere; and in some examples both automatically and manually adding said effect(s) as described elsewhere. In some examples automated controls 1312 and/or manual controls 1312 may be applied so that each individual addition of one or a plurality of effects 1308 operates in accordance with the settings of said controls 1312 as described elsewhere; and in some examples to each step in the addition of one or a plurality of effects 1308 as described elsewhere.

In some examples output 1309 1309*a,b,c* . . . *n* includes for each simultaneously received source 1301 1301*a,b,c* . . . *n* that does not require synthesis 1305 1305*a,b,c* . . . *n*, and for each simultaneously synthesized 1305 1305*a,b,c* . . . *n* set of designated sources 1306; in some examples automatically outputting the appropriate one or a plurality of outputs 1309 1309*a,b,c* . . . *n* 1310 as described elsewhere, and in some examples manually designating the appropriate one or a plurality of outputs 1309 1309*a,b,c* . . . *n* 1310 as described elsewhere, and in some examples both automatically and manually outputting the appropriate one or a plurality of outputs 1309 1309*a,b,c* . . . *n* 1310 as described elsewhere. In some examples automated controls 1312 and/or manual controls 1312 may be applied so that each individual output 1309 1309*a,b,c* . . . *n* 1310 operates in accordance with the settings of said controls 1312 so that each control setting corresponds in some examples to the appropriate output 1309 1309*a,b,c* .

. . *n* 1310 as described elsewhere; and in some examples to each output step 1309 1309*a,b,c* . . . *n* 1310 as described elsewhere.

Figure 73:
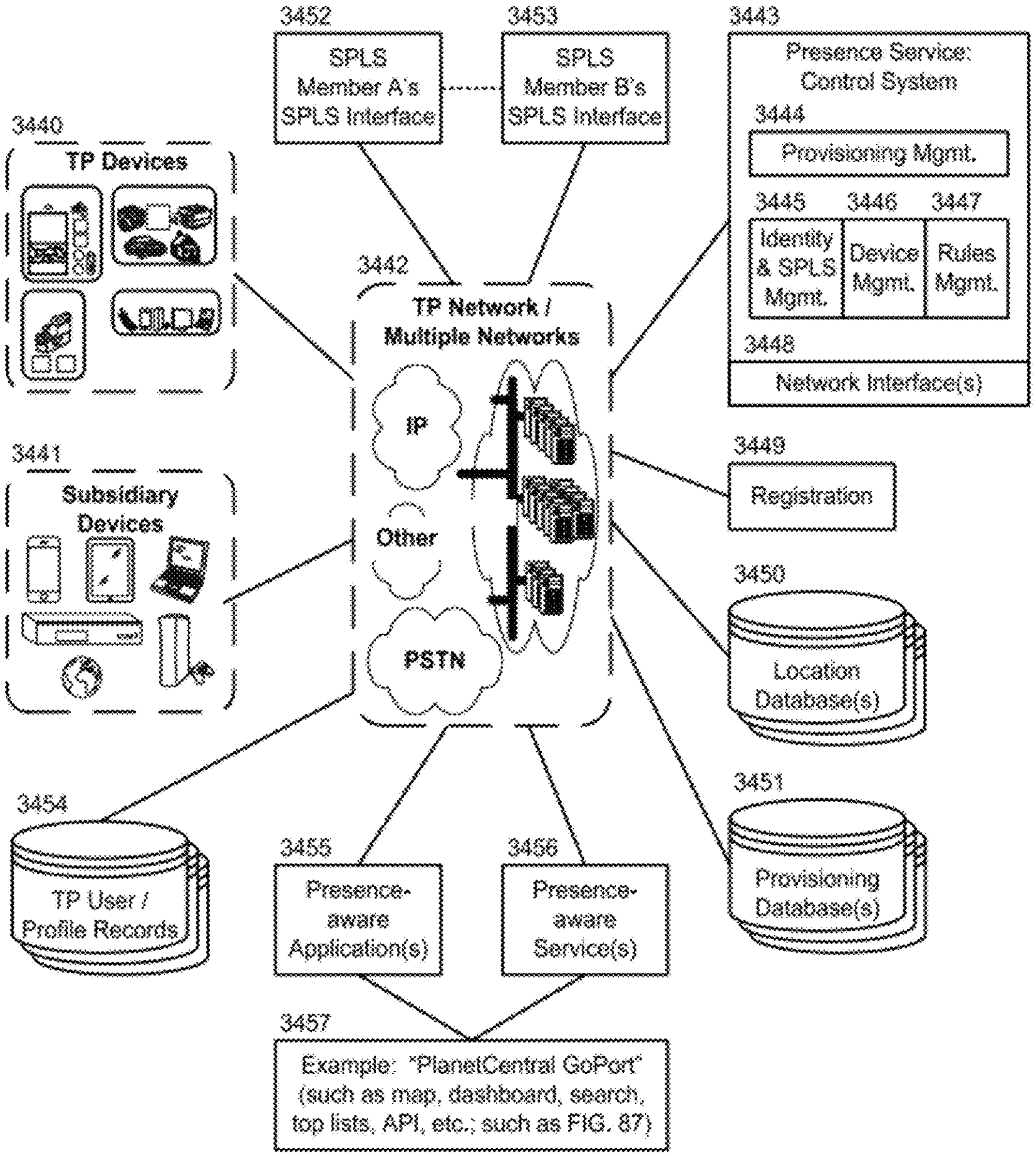
FIG. 73 is a block diagram that illustrates some examples of a TP presence architecture.
Figure 82A:
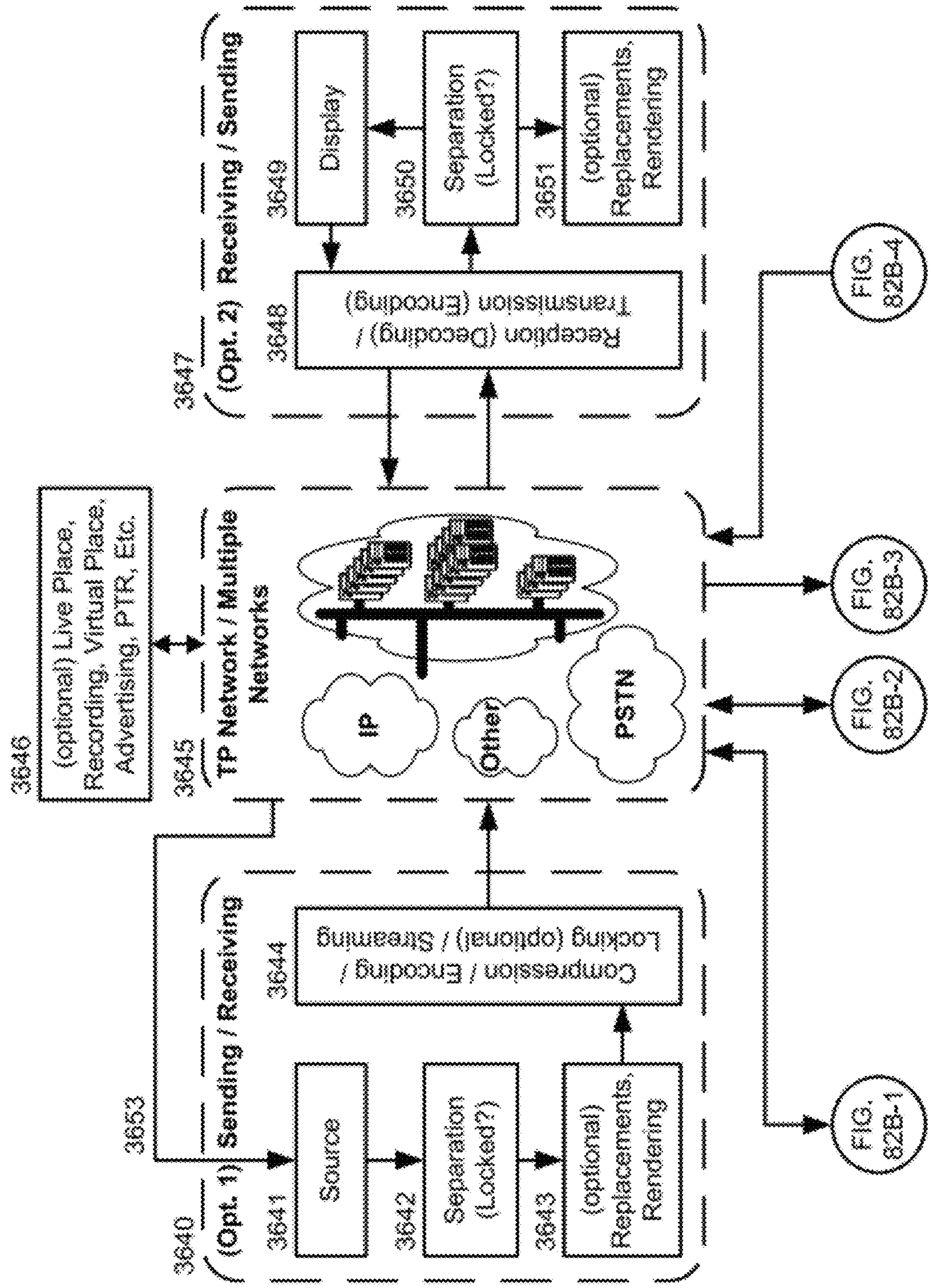
FIG. 82 is a block diagram showing some examples of options for presence at a place such as in some of the examples syntheses when sending/receiving, when receiving/sending, by means of network alterations, and by substituting an altered reality at a source.
Figure 82B:
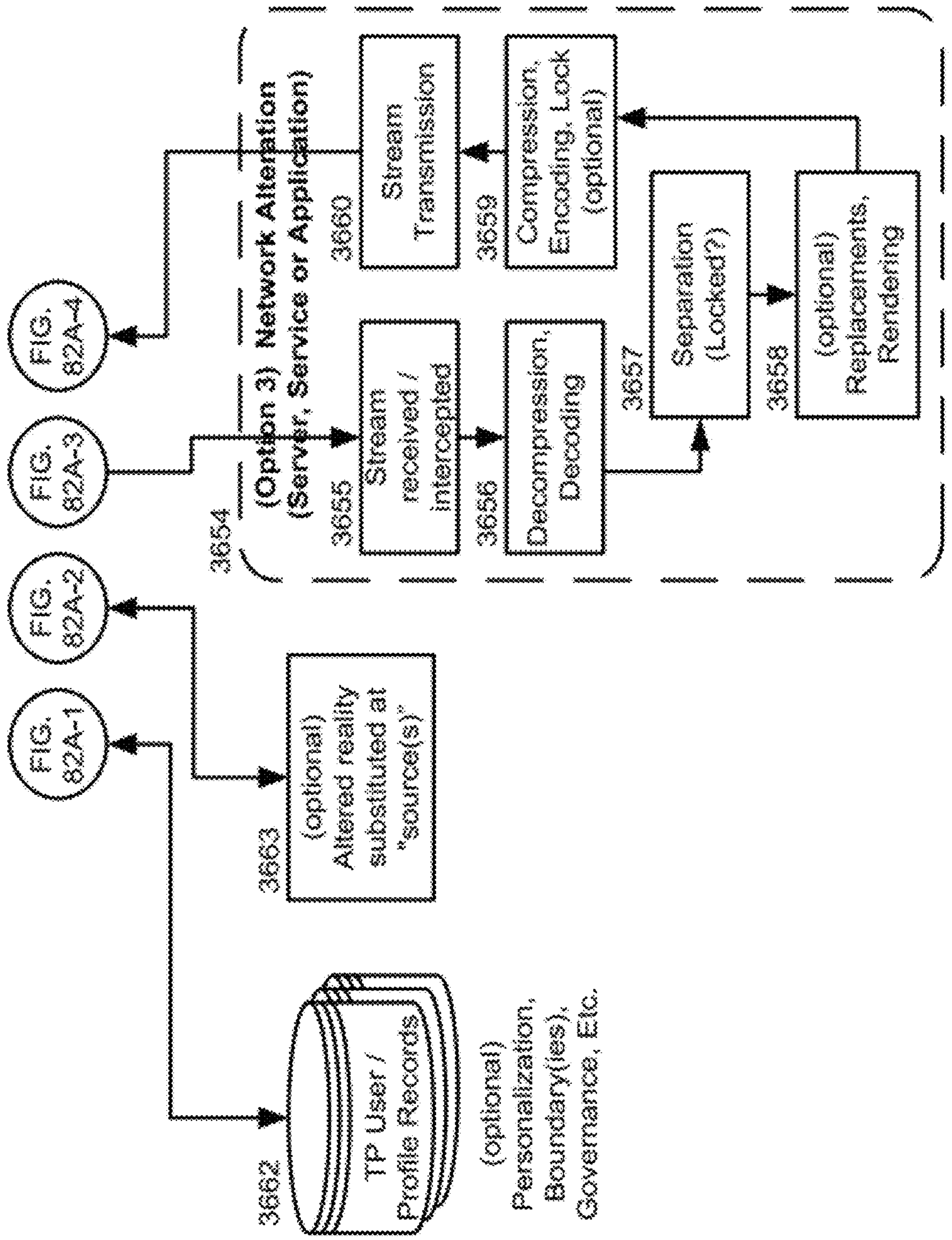
Figure 85A:
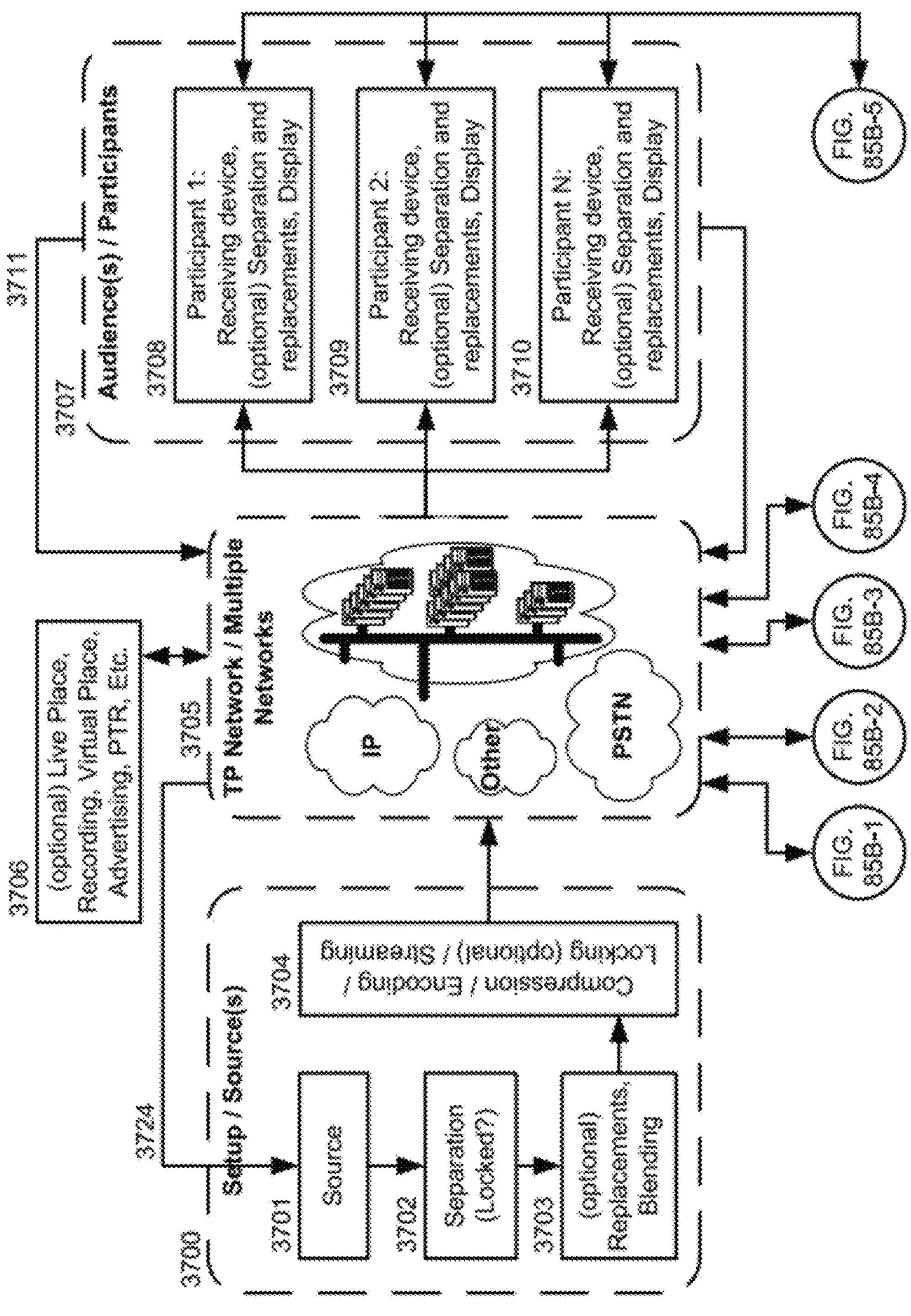
FIG. 85 is a block diagram showing some examples of a TP audience(s) interacting at a place(s).
Figure 85B:
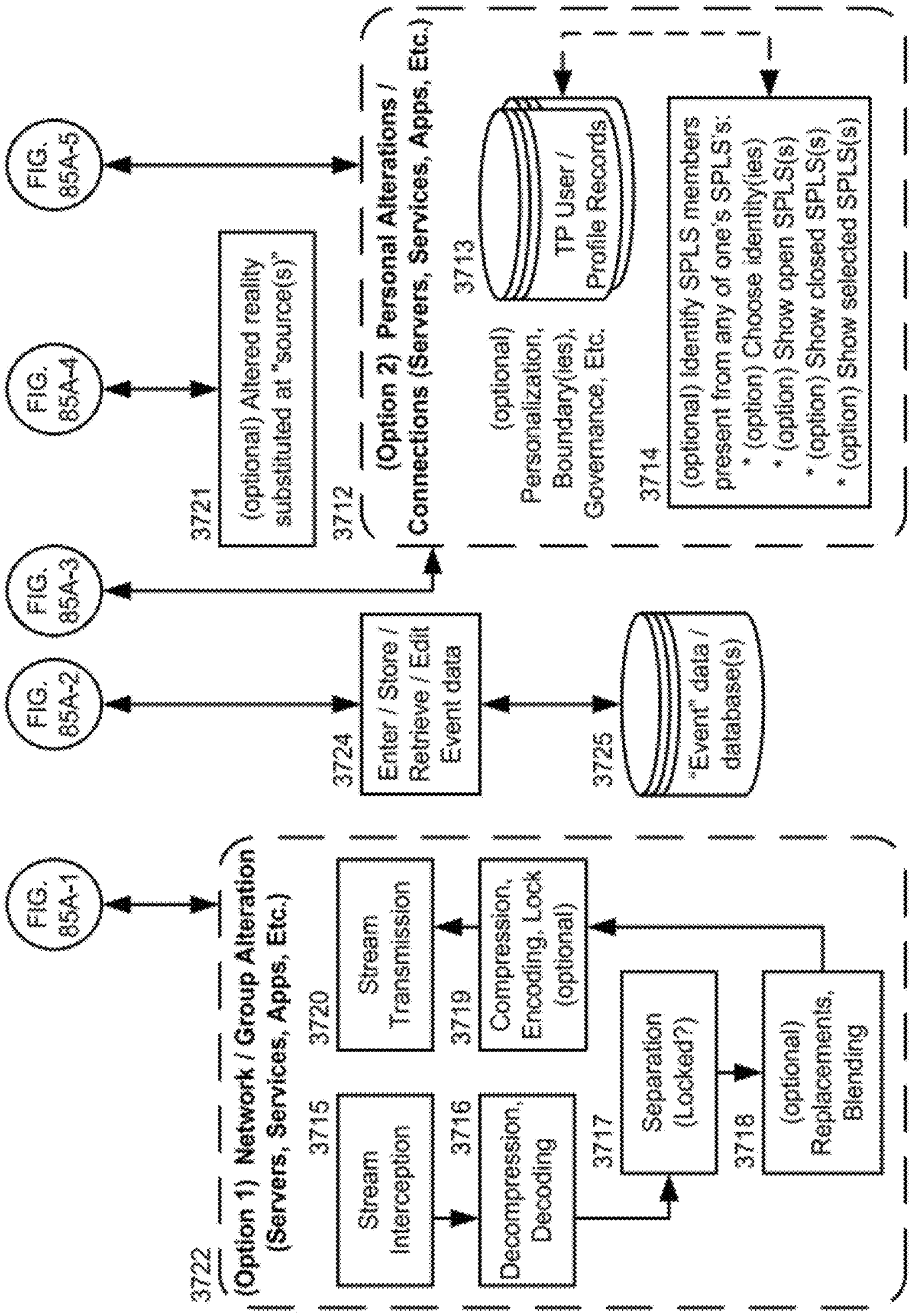

In some examples a plurality of local and remote TP devices provide said simultaneous processing and/or output (such as in some cases by remote control, in some cases by a shared device, in some cases by other means, etc.) as described elsewhere such as in some examples FIG. 34 "Local and Distributed TP Processing Locations," FIG. 73 "Example Presence Architecture," FIG. 82 "TP Configurations for Presence at a Place(s)," FIG. 85 "TP Interacting Group(s) at Event(s) or Place(s)," and elsewhere. In some examples a local device may provide processing as described elsewhere such as in some examples that are in FIG. 29 through FIG. 33. In some examples a receiver's device may provide said processing as described elsewhere; in some examples a network resource device may provide said processing as described elsewhere; and in some examples a plurality of local and remote devices perform said simultaneous processing at a plurality of locations by a plurality of devices which each perform some or all of said simultaneous processing as described elsewhere.

Loca and distributed TP device processing locations: Turning now to FIG. 34, "TP Local and Distributed TP Device Processing Locations," in some examples one option is a TP device 1 1280 that provides processing as described elsewhere such as in some examples one or a plurality of sources are received 1281 1282 from remote sources like another TP device 1288 1281 1282, in some examples from an AID/AOD 1298 1281 1282, in some examples from optional network processing 1294 1281 1282, in some examples from optional remote sources 1285 1281 1282, in some examples from a local source 1282 like a camera or microphone, and in some examples from one or a plurality of other input sources 1281 1282. In some examples device reception 1281 of one or a plurality of sources 1288 1298 1294 1285 includes decoding 1281, in some examples decompression 1295, in some examples format conversion 1281 or another reception process as described elsewhere 1281. In some examples device synthesis 1283 is performed as described elsewhere, in some examples one or a plurality of foreground/background separations 1283 and/or background replacements is performed 1283, in some examples one or more sources 1281 1282 are "locked" as described elsewhere so their background may not be replaced; in some examples one or a plurality of subsystems 1283 are run as described elsewhere. In some examples one or a plurality of output(s) 1284 are displayed locally 1284 1281. In some examples one or a plurality of device output(s) 1284 are encoded for transmission 1281, in some examples compressed for transmission 1281, in some examples "locked" 1281 as described elsewhere prior to transmission, and in some examples streamed 1281 or transmitted 1281. In some examples synthesis 1283 and/or subsystems 1283 reflect(s) a user's profile 1299, in some examples a user's manual settings 1283, in some examples a different user's/tool's/source's settings 1288 1285 including background replacement(s) 1283 which in some examples includes a remote place 1285 1288 1294, in some examples includes content such as tools or resources 1285 1288 1294, in some examples includes advertisements 1285 1288 1294, or in some examples include any combination of complete or partial background replacement(s) 1283 that may be different for one participant 1280 from one or a plurality of other participants 1288 1298 so that it is possible that the participants may be together digitally while their backgrounds appear to be different enough that each sees their shared presence as if they were in a different "digital place." In some examples one or a plurality of advertisements displayed in said synthesis 1283 fit a participant's Paywall 1299 so it earns money for one or a plurality of participants, as described elsewhere.

From a network view two or a plurality of TP devices 1280 1288 1285 1298 1299 1294 are attached to one or a plurality of networks 1286 in some examples a Teleportal Network 1286, in some examples an IP network 1286 such as the Internet, in some examples a LAN (Local Area Network) 1286, in some examples a WAN (Wide Area Network) 1286, in some examples a PSTN 1286 such as a Public Switched Telephone Network, in some examples a cellular network 1286, in some examples another type of network 1286 such as a cable television network that is configured to provide IP and VOIP telephone, in some examples a plurality of disparate networks 1286.

In some examples a second or a plurality of TP devices 2 through N 1288 are attached to said network(s) 1286 and provide processing as described elsewhere such as in some examples one or a plurality of sources are received 1289 1290 from remote sources like another TP device 1280 1289 1290, in some examples from optional network processing 1294 1289 1290, in some examples from optional remote sources 1285 1289 1290, in some examples from a local source 1289 like a camera or microphone, and in some examples from one or a plurality of other input sources 1289 1290. In some examples device reception 1289 from one or a plurality of sources 1280 1298 1294 1285 includes decoding 1289, in some examples decompression 1295, in some examples format conversion 1289 or another reception process as described elsewhere 1289. In some examples device synthesis 1291 is performed as described elsewhere, in some examples one or a plurality of foreground/background separations 1291 and/or background replacements is performed 1291, in some examples one or more sources 1289 1290 are "locked" as described elsewhere so their background may not be replaced; in some examples one or a plurality of subsystems 1291 are run as described elsewhere. In some examples one or a plurality of output(s) 1292 are displayed locally 1292 1289. In some examples one or a plurality of device output(s) 1292 are encoded for transmission 1289; in some examples compressed for transmission 1289, in some examples "locked" 1289 as described elsewhere prior to transmission, and in some examples streamed 1289 or transmitted 1289. In some examples synthesis 1291 and/or subsystems 1291 reflect(s) a user's profile 1299, in some examples a user's manual settings 1291, in some examples a different user's/tool's/source's settings 1280 1285 including background replacement(s) 1291 which in some examples includes a remote place 1285 1280 1294, in some examples includes content such as tools or resources 1285 1280 1294, in some examples includes advertisements 1285 1280 1294, or in some examples include any combination of complete or partial background replacement(s) 1291 that may be different for one participant 1288 from one or a plurality of other participants 1280 1298 so that it is possible that the participants may be together digitally while their backgrounds appear to be different enough that each sees their shared presence as if they were in a different "digital place." In some examples one or a plurality of advertisements displayed in said device synthesis 1291 fit a participant's Paywall 1299 so it earns money for one or a plurality of participants, as described elsewhere.

In some examples network processing 1294 is another option wherein said processing 1294 is performed by a server, service, application, etc. accessible over one network 1286 or a plurality of disparate networks 1286. In some examples hardware or technology reasons for this include a device that is resource limited such as an AID/AOD 1298; in some examples a user may own or have access to device that may be utilized by remote control 1294 (such as in some examples an LTP, in some examples an RTP, in some examples an MTP, in some examples a subsidiary device as described elsewhere, etc.); in some examples more advanced processing applications, features or processing capabilities may be desired then a local device can perform; etc. In some examples network processing 1294 may be performed for business or other reasons such as in some examples to insert advertising in the background 1294 1299 1285; in some examples to provide the same virtual location and content for all participants at an event 1285 1294 1299; in some examples to provide a different background, content and/r advertisements for each participant at an event 1280 1288 1285 1294 1299; in some examples to substitute an altered reality 1294 for a participant 1280 1288 with or without the participant's knowledge as described elsewhere; in some examples to provide additional processing 1294 as a free service or as a paid service; etc.

In any of these or other examples network processing 1294 is attached to said network(s) 1286 and provides processing as described elsewhere. In some examples of network processing 1294 a stream is received 1295 or intercepted 1295 such as in some examples from a device 1280 1288 1298 and/or a remote source 1285; in some examples one or a plurality of sources are received 1295 1296 from remote sources like a device 1280 1288 1285 1298, in some examples from another optional source that provides network processing 1294, in some examples from optional remote sources 1285 1289, and in some examples from one or a plurality of other input sources 1295 1296. In some examples network processing reception 1295 from one or a plurality of sources 1280 1288 1298 1285 includes decoding 1295, in some examples decompression 1295, in some examples format conversion 1295, or in some examples another reception process as described elsewhere 1295. In some examples network processing synthesis 1297 is performed as described elsewhere, in some examples one or a plurality of foreground/background separations 1297 and/or background replacements is performed 1297, in some examples one or more sources 1295 1296 are "locked" as described elsewhere so their background may not be replaced; in some examples one or a plurality of subsystems 1297 are run as described elsewhere. In some examples one or a plurality of network processing output(s) 1300 are encoded for transmission 1300, in some examples compressed for transmission 1300, in some examples "locked" 1300 as described elsewhere prior to transmission, and in some examples streamed 1300 or transmitted 1300. In some examples synthesis 1297 and/or subsystems 1297 reflect(s) a user's profile 1299, in some examples a user's manual settings 1297, in some examples a different user's/tool's/source's settings 1280 1288 1298 1285 including background replacement(s) 1297 which in some examples includes a remote place 1285 1280 1288, in some examples includes content such as tools or resources 1285 1280 1288, in some examples includes advertisements 1285 1280 1288 1299, or in some examples include any combination of complete or partial background replacement(s) 1297 that may be the same for all participants 1280 1288 1298; or in some examples complete or partial background replacement(s) 1297 may be different for one participant 1280 from one or a plurality of other participants 1288 1298 so that it is possible that the participants may be together digitally while their "digital place" and/or other parts of their background(s) appear to be different enough that they each appear to be in a different "digital place(s)." In some examples one or a plurality of advertisements displayed in said network processing synthesis 1297 fit one or a plurality of participants' Paywall(s) 1299 so said Paywall(s) earn money for one or a plurality of participants, as described elsewhere.

Device(s) commands entry: Turning now to FIG. 35, "Device(s) Commands Entry," this illustrates some examples of part of the process of entering commands into TP devices. In some examples device commands entry starts with a device that is in an on state 1320 and has one or a plurality of processes that are in a waiting state ready to receive a command(s) 1320. In some examples this includes one or a plurality of user I/O device(s) 1321 and/or user I/O interface(s) 1321 that are on and ready to transmit or execute a command (s) 1321.

In some examples said user I/O device(s) 1321 and/or user I/O interface(s) 1321 are on and said device 1321 is on and ready to receive a command(s) 1320. In some examples a user I/O device(s) 1321 may be turned off 1322, and/or in some examples a user I/O interface(s) 1321 may be turned off 1322, in which case said user I/O device(s) 1321 and/or user I/O interface(s) 1321 must first be turned on at the device level 1320. When turned on, this begins for each command 1323 by entering a command with a user I/O device or peripheral, and determining the type of command it is by determining the type of user I/O device that originates said command 1324 1325 1326 1327 1328, and the command issued 1324 1325 1326 1327 1328. In some examples said user I/O device(s) 1321 and/or user I/O interface(s) 1321 is a pointing device 1324 by which a user inputs spatial (in some examples including multi-dimensional) data generally indicated by physical gestures that are paralleled on a screen by visual changes such as moving a visible pointer (including a cursor); in some examples said pointing device 1324 is a mouse 1324; in some examples a pointing device is a trackball 1324; in some examples a pointing device is a joystick 1324; in some examples a pointing device is a pointing nub 1324 (a pressure sensitive small knob such as those embedded in the center of a laptop keyboard); in some examples a pointing device is a stylus 1324 (a pen-like device such as used on a graphics tablet); or in some examples is another type of pointing device 1324.

In some examples said user I/O device(s) 1321 and/or user I/O interface(s) 1321 is a voice interface 1325 device by which a user inputs voice or speech commands to control a device; in some examples said voice control of a device includes a wired microphone(s) 1325; in some examples said voice control of a device includes a wireless microphone(s) 1325; in some examples said voice control of a device includes an audio speaker(s) to provide audio feedback 1325; in some examples said voice control 1325 affects part of a device but not all of the device such as voice control over voicemail, or such as a voice-controlled web browser; in some examples said voice interface 1325 is used to control another interface device such as a remote control 1327 that in turn turns said voice controls into commands that are sent to control the device.

In some examples said user I/O device(s) 1321 and/or user I/O interface(s) 1321 is a touch interface 1326 device by which a user touches a device's display with in some examples one finger 1326, in some examples two or more fingers 1326 (such as a "swipe"), in some examples a hand 1326, in some examples an object 1326 (such as using a stylus on a graphics tablet), in some examples other means or combinations. In some examples a touch interface is a touch screen 1326 that includes part of or all of a device's display (s); in some examples a touch interface is a touchpad 1326 that is a small stationary surface used for touch control such as for many laptop computers; in some examples a touch interface is a graphics tablet 1326 that is usually controlled with a pen or a stylus; or in some examples another type of touch interface 1326.

In some examples said user I/O device(s) 1321 and/or user I/O interface(s) 1321 is a remote control 1327 (as described in more detail in FIGS. 36 and 37) by which the user operates a TP device wirelessly from a close line-of-sight distance using a handheld controller, which is also known by names such as a remote, a controller, a changer, etc. Various types of remote controls are typically used to control electronic devices such as televisions, stereo systems, home theater systems, DVD player/recorders, VCR players/recorders, etc., and may also be used to control some functions of PCs (such as in some examples a PC's media functions). In some examples a "universal remote control" emulates and replaces the individual remote controls from multiple electronic devices by being able to transmit the commands from multiple brands and models to control numerous electronic devices. In some examples a remote control 1327 includes a touchscreen whose interface provides graphical means for representing functions or buttons virtually (such as a virtual keyboard for text input), for displaying virtual buttons or controls, for including feedback from a device, for showing which device is being controlled (where a TP device uses remote control of other devices), for adding instructions (if needed), and for providing other features and functions. In some examples motion sensing is one means of exercising remote control 1327 such as in some examples the Wii Remote, Wii Nunchuck and Wii MotionPlus for Nintendo's Wii game console (which use features such as accelerometers, optical sensors, buttons, "rumble" feedback, gyroscope, a small speaker, sensor bar, an on-screen pointer, etc.). Remote controls 1327 typically communicate by IR (Infrared) signals, Bluetooth or radio signals. In some examples of using a remote control 1327 a user presses one or a plurality of real buttons (or virtual buttons or images on a graphical touchscreen) to directly operate 1327 a local TP device: or in some examples to control 1327 another device that the TP device controls (such as in some examples when a TP device remote controls a PC 1327, in some examples when a TP device remote controls a television set top box 1327, in some examples when a TP device remote controls another TP device 1327, in some examples when a TP device remote controls a different type of electronic device 1327).

In some examples said user I/O device(s) 1321 and/or user I/O interface(s) 1321 is another type of user I/O device 1328 such as in some examples a graphics tablet or digitizing tablet 1328; in some examples a puck 1328 (which in some examples is used in CAD/CAM/CAE tracing); in some examples a standard or specialized keyboard 1328; in some examples a configured smart phone 1328; in some examples a configured electronic tablet or pad 1328; in some examples a specialized version of a touch interface may be controlled by a light pen 1328; in some examples eye tracking 1328 (in some examples control by eye movements); in some examples a gyroscopic mouse 1328 (in some examples a mouse that can be moved through the air and used while standing up); in some examples gestures with a tracking device 1328 (in some examples for controlling a device with physical movements with the gestures performed by a hand in some examples, by a mouse in some examples, by a stylus in some examples, or by other means); in some examples a game pad 1328; in some examples a balance board 1328 (in some examples for exercising with a video game system); in some examples a dance pad 1328 (in some examples for dance input during a game); in some examples a simulated gun 1328 (in some examples for shooting screen objects during a game); in some examples a simulated steering wheel 1328 (in some examples for driving a vehicle during a game); in some examples a simulated yoke 1328 (in some examples for flying a plane during a game); in some examples a simulated sword 1328 (in some examples for virtual fighting during a game); in some examples simulated sports equipment 1328 (such as a simulated tennis racket in some examples such as for playing a sport during a game); in some examples a simulated musical instrument(s) 1328 (such as a simulated guitar in some examples such as for playing an instrument during a musical game); in some examples sensors 1328 (in some examples sensors observe a user[s] and respond to inferred needs without the user providing an explicit command); in some examples another type of user I/O device 1328.

In some examples these varied user I/O devices 1323, features 1323, capabilities 1323, etc. are components of providing a customized, personalized yet consistent interface for the various TP devices employed by each user—as described in FIG. 7 through FIG. 9, in FIG. 17, FIG. 183 through FIG. 187, and elsewhere. In some examples these varied user I/O devices 1323, features 1323, capabilities 1323, etc. are components of providing a customized, personalized yet consistent interface for the various subsidiary devices employed by each user through the use of TP devices—as described in FIG. 7 through FIG. 9, in FIG. 17, FIG. 183 through FIG. 187, and elsewhere. In some examples these varied user I/O devices 1323, features 1323, capabilities 1323, etc. are components of providing a customized, personalized yet consistent interface for the various AIDs/AODs employed by each user as extensions of Teleportaling—as described in FIG. 9, FIG. 17, and elsewhere. In some examples of this, such as in FIG. 186, interface components 9298 may be stored and retrieved from repositories 9306 9309 and applied a new interface designs 9300 9301 to construct various new services 9302 9303 9308 or to update existing services 9304 9301 9302 9303 9308. In some examples this provides consistent that are useful and predictable across a broad range of varied user I/O devices 1324 1325 1326 1327 1328 for numerous core functions of a digital environment such as communicating, viewing, recording, creating, editing, broadcasting, etc. with multiple simultaneous input and output streams and channels for use on TP devices of varying capabilities and form factors.

In some examples after determining the type of command it is by determining the type of user I/O device that originates said command 1324 1325 1326 1327 1328, and the command issued by said user I/O device 1324 1325 1326 1327 1328, said command 1323 is received 1330. In some examples said command 1323 1324 1325 1326 1327 1328 is a TP device command 1331 that is immediately recognized such as in some examples to select and SPLS, in some examples to open an SPLS, and in some examples to open a focused connection with one or a plurality of SPLS members. In some examples said TP device command 1331 is immediately applied to the appropriate Device in Use (DIU) which in some examples is a Local Teleportal 1335; in some examples is a Remote Teleportal 1335; in some examples is on a Teleportal network such as in some examples a Teleportal Server 1335, in some examples a TP service 1335, etc.; in some examples is a TP application 1335; in some examples is a subsystem 1336 in a TP device 1335; in some examples is a TP subsystem 1336 controlled by an RCTP (Remote Control Teleportal) 1337; in some examples is a TP subsystem 1336 controlled by a VTP (Virtual Teleportal) 1338; in some examples is an RCTP (Remote Control Teleportal) 1337; and in some examples is a VTP (Virtual Teleportal) 1338.

In some examples said entered command 1323 1324 1325 1326 1327 1328 is not a TP device command 1331, but instead it is a known I/O device 1332 whose commands are recognized as relating to a specific DIU (Device in Use) 1335 1336 1337 1338; or in some examples said command is a known device command 1332 that applies to a particular DIU 1335 1336 1337 1338. In some examples a known I/O device command 1332 is not a TP device command 1331, so it is translated 1333 by receiving the command sent 1323 1324 1325 1326 1327 1328 and determining the TP command 1333 1334 necessary to perform the requested action. In some examples entering a command 1323 on a user I/O device 1324 1325 1326 1327 1328 that is directed toward a particular DIU such as in some examples a subsidiary device 1337 controlled by an RCTP, or in some examples an AID/AOD 1338 controlled by a VTP, causes an automated command translation 1332 1333 1334 which in some examples retrieves from (local or remote) storage 1334 a list of available commands for said DIU and each of their RCTP parallel commands 1337, and each of their VTP parallel commands 1338. Said translation 1333 1334 selects the appropriate RCTP command 1337, or VTP command 1338, as needed for the particular DIU that is being controlled 1337 1338. Said translated command 1333 1334 is then sent to the particular DIU 1337 1338 to perform the requested action.

In some examples said entered command 1323 1324 1325 1326 1327 1328 is not a TP device command 1331, and it is also not a known I/O device command 1332, and it is also not a known device command 1332 that applies to a particular Device in Use (DIU) 1335 1336 1337 1338, so in some examples a new user I/O device 1340 may be added; in some examples a new feature 1340 may be added to an existing user I/O device 1323 1324 1325 1326 1327 1328; and in some examples a new command 1340 may be added to an existing user I/O device 1323 1324 1325 1326 1327 1328. In some examples the addition of a new user I/O device 1340, a new feature 1340 to an existing user I/O device, or a new command 1340 to an existing user I/O device (herein collectively referred to as an "Addition") starts by an initiating said Addition 1341; in some examples said Addition 1341 requires (optionally) automatically or manually retrieving 1342 the appropriate configuration from (local or remote) storage 1343 (which may include in some examples an installation CD-ROM 1342, in some examples an installation DVD 1342, in some examples a manual or automated download 1342, or in some examples other manual or automated means for retrieving 1342 1343 a configuration); in some examples configuration 1344 of said Addition is automated while in some examples configuration 1344 is a manual step; in some examples one or a plurality of (optional) tests 1345 may be performed automatically and visibly, in some examples said tests 1345 may be performed automatically and invisibly, in some examples said tests 1345 may be performed manually, and in some examples testing 1345 is not performed; in some examples tests 1345 are performed and if one or more parts of said tests fail re-configuration 1344 may be performed, or (optionally) a different configuration may be retrieved 1342 1343 to perform said re-configuration 1344; in some examples use 1346 of said Addition requires the user or the system to modify the Addition and in such a case re-configuration 1344 may be performed, or (optionally) a different configuration may be retrieved 1342 1343 to perform said re-configuration 1344; in some examples use 1346 of said Addition accomplishes the desired result so that said Addition 1340 is complete and goes into use 1321.

Figure 36:
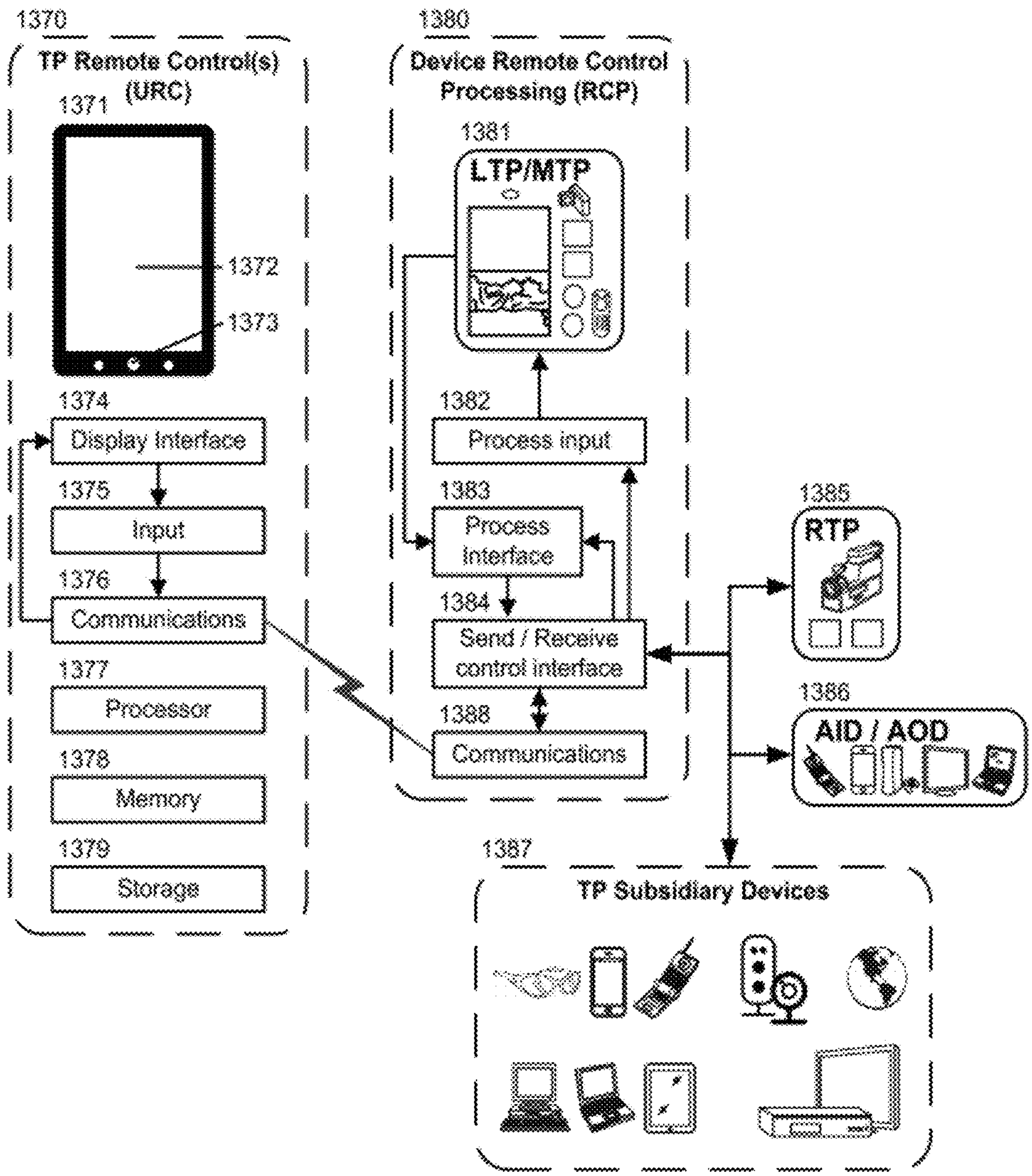
FIG. 36 is a pictorial block diagram showing an example universal remote control for some Teleportal devices.

Universal remote control: One category of user I/O devices 1321—a TP Universal Remote Control (URC) 1327—has the potential to improve the use of other digital devices substantially, because said TP remote controls 1327 separate their use from the need to control each TP device directly and individually—making it possible to use and control one or a plurality of devices from a single portable and wireless controller. Said URC is described in FIG. 36 and FIG. 37:

FIG. 36, "Universal Remote Control": In some examples a universal remote control can be used to control the use of other TP devices. In some examples said controlled TP devices may be used to control TP subsidiary devices (as described elsewhere); and in some examples said controlled TP devices may be used to control RTPs (as described elsewhere). In such a case said controlled TP devices do not need to each be run directly and personally; instead, a plurality of TP devices and their plurality of digital realities may be chosen, Ron, created, used, etc. from one or a plurality of TP remote controls.

Figure 37:
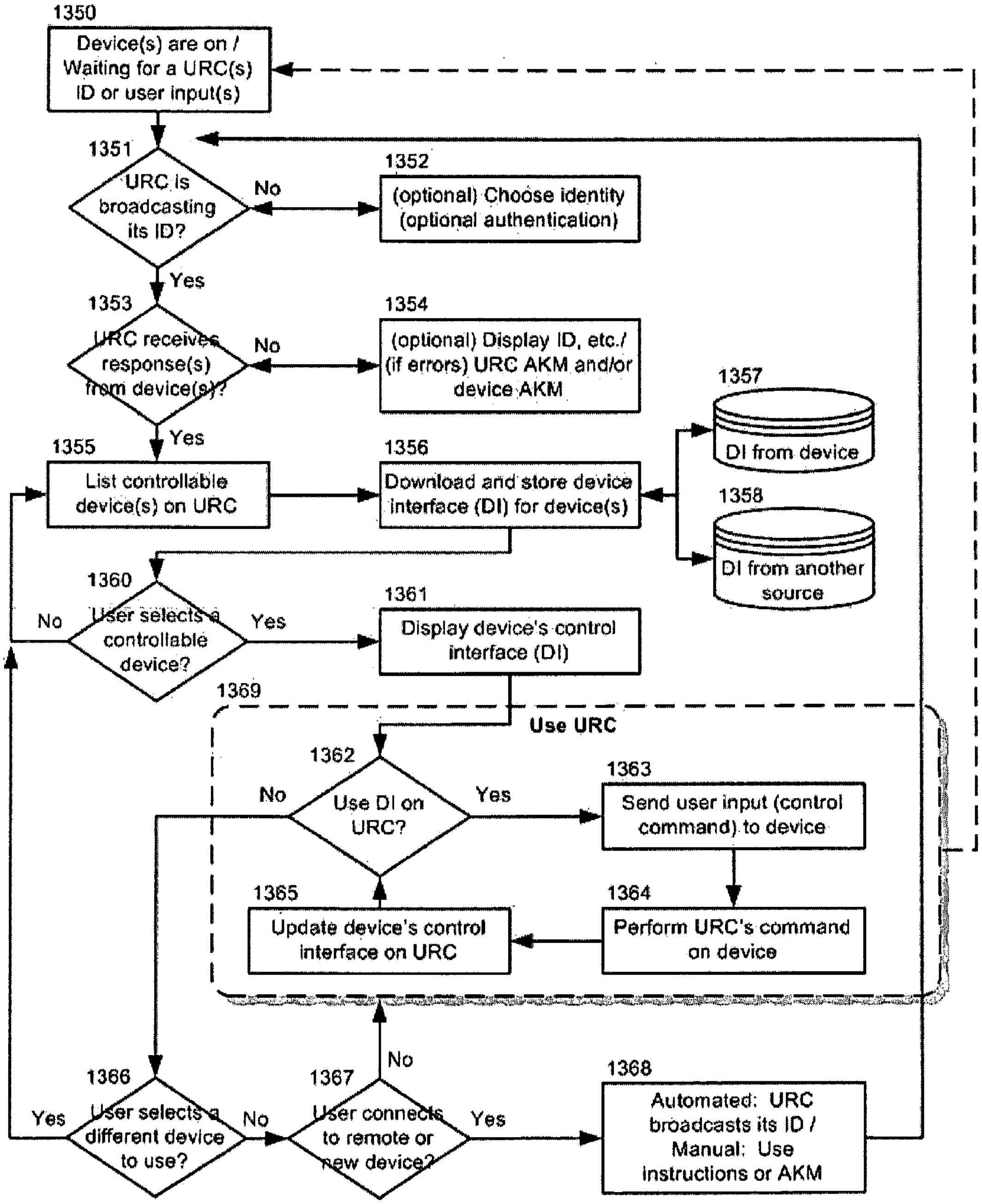
FIG. 37 is a flow chart showing some examples of procedures for a universal remote control interface.

FIG. 37, "Universal Remote Control Interface": In some examples a single remote control may dynamically discover and take control of a plurality of TP devices so that a user may select and control one or a plurality of controllable devices. In some examples said remote control displays scrollable or selectable portions of a selected device's interface; In some examples said remote control displays a selected device's control interface; in some examples the remote control displays a specialized control interface; and in some examples the remote control displays a subset of a device's interface (or its control interface). In some examples a remote control's interface may be updated with marketing messages or advertising such as in some examples by fitting a user's behavior and use of a TP device, and in some examples by repeating a set of marketing messages in accordance with advertiser specifications and advertisement purchases.

Turning now to FIG. 36, "Universal Remote Control (URC)," with one or a plurality of TP remote controls 1370 a user may utilize one or a plurality of TP devices 1380 1385 in some examples; utilize one or a plurality of TP subsidiary devices 1387 in some examples; and/or be utilized by one or a plurality of AIDs/AODs 1386 in some examples—literally a range of digital devices 1380 1385 1386 1387 and digital capabilities—without needing to run each one of them personally and directly. Instead, a growing range of digital devices, environments, tools, services, applications, etc. 1380 1385 1386 1387—together, a plurality of digital realities—may be created, run and used from one or a plurality of TP remote controls 1370.

As a result in some examples a Universal Remote Control (herein URC) provides a consistent system wherein the devices, services, applications, etc. 1380 1385 1386 1387 (which in some examples may also be other types of electronic devices) and the associated remote control(s) 1370 automatically connect and communicate as soon as both have power and are turned on—in other words, using this universal remote control system is automated.

URC 1370: In some examples said URC 1370 includes a display screen 1372 1374 and one or more means for user input 1372 1373 1375 which in some examples includes a touchscreen 1372 1375, in some examples includes physical buttons 1373 1375, and in some examples include other user input means such as described in user I/O devices in FIG. 35 and elsewhere. Said URC 1370 also includes wireless communications 1376 that may employ any type of wireless communications (which in some examples is WiFi 1376 1388, in some examples line-of-sight IR {Infrared] 1376 1388, in some examples radio 1376 1388, in some examples Bluetooth 1376 1388, and in some examples other means for wireless communication 1376 1388) that is configured to communicate with one or a plurality of devices 1380 1388 and can couple together an enabled URC(s) 1370 and an enabled device(s) 1380. In some examples said URC's display screen 1372 1374 displays one or a plurality of components of said controlled device's interface 1381 1383 where said display 1372 1374 may employ any type of display (which in some examples is an LCD [Liquid Crystal Display] that includes a touchscreen for user input). In some examples said URC 1370 includes a processor 1377 which may employ any type of computer processor (which in some examples is a CPU [Central Processing Unit] 1377, in some examples is a DSP [Digital Signal Processor] 1377, in some examples is a microcontroller 1377, in some examples is a device controller 1377, in some examples is a computation engine 1377 and in some examples is other means for processing 1377). In some examples said URC 1370 includes local memory 1378 and local storage 1379 which may employ any type of volatile and non-volatile storage that can hold data in some examples when the URC 1370 is powered down, and in some examples when the URC 1370 is on and processing (which in some examples is RAM [Random-Access Memory] 1378, in some examples SRAM [Static RAM] 1378, in some examples DRAM [Dynamic RAM] 1378, in some examples a hard drive 1379, in some examples flash memory 1379, in some examples ROM [Read-Only Memory] 1379, in some examples EPROM [Erasable Programmable Read-Only Memory] 1379, in some examples an optical disk drive 1379, and in some examples is other means for memory 1378 and storage 1379).

TP device(s) remote control processing 1380: In addition to other hardware, functions, features and capabilities as described elsewhere, in some examples a TP device that is enabled for remote control includes Remote Control Processing (herein RCP) 1380. In some examples said RCP 1380 includes wireless communications 1388 that may employ any type of wireless communications (which in some examples is WiFi 1388 1376, in some examples is IR 1388 1376, in some examples is radio 1388 1376, in some examples is Bluetooth 1388 1376, and in some examples is other means for wireless communication 1388 1376) that is configured to communicate with one or a plurality of URC's 1370 1376 and can couple together an enabled URC(s) 1370 and an enabled device(s) 1380. In some examples said RCP 1380 includes processing 1383 1382 which in some examples employs the device's 1380 processor(s), and in some examples employs another processor(s) 1383 1382 which may be any type of computer processor (which in some examples is a microcontroller 1383 1382, in some examples is a DSP [Digital Signal Processor] 1383 1382, in some examples is a GPU 1383 1382, in some examples is a device controller 1383 1382, in some examples is a computation engine 1383 1382 and in some examples is other means for processing 1383 1382). In some examples said RCP 1380 includes local memory and local storage which may employ any type of volatile and non-volatile storage that can hold data in some examples when RCP 1380 is powered down, and in some examples when RCP 1380 is on and processing (which in some examples is the device's local memory and local storage, and in some examples is additional memory and/or additional storage).

Remote control of TP Devices: In some examples each TP device's RCP 1380 1381 includes interface processing 1383 that extracts the control and navigation components of the device's interface 1381 1383 as if that were presented in a small interface control window on its display. In some examples said interface processing 1383 utilizes a markup language that renders and describes a GUI (Graphical User Interface) 1383, controls 1383, as well as include data 1383 (which in some examples is HTML 1383, in some examples is XML 1383, in some examples is XHTML 1383, in some examples is another user interface markup language 1383 that provides reuse for presenting a user interface). Instead of displaying said processed interface control window 1383 on the device's display 1381, said processed interface control window is communicated 1388 through a wireless connection to a URC's communications 1376, and displayed 1374 on the URC's display 1372. When a user interacts with the URC's display interface 1372 1374, the user's inputs 1372 1373 1375 are communicated 1376 to the device's RCP communications 1388 where said user's remote control inputs 1375 are received 1384, processed 1382 as if they were entered on a small interface control window on the local display, and said user inputs control the device 1381 (in some examples as described in FIG. 35 and elsewhere). In some examples said small interface control window includes RCTP control of a subsidiary device(s) 1387 as described elsewhere. In some examples said small interface control window includes control over an RTP(s) 1385 as described elsewhere.

Therefore, without constructing an "intelligent" remote control device or system, the TP's URC provides remote control 1370 over one or a plurality of devices 1380 1385 1387 through a scalable system of extending the display of a device's interface 1381 1383 1384 1388 to a remote control 1370 1371 where it is received and displayed 1376 1374 1372, and a user's inputs on said URC 1372 1373 1375 are communicated 1376 1388 and processed by said RPC 1384 1382 1381. As a result, in some examples a URC 1370 operates a TP device 1380 as if a user had interacted directly with an interface window that was displayed on the TP device's display, and therefore the URC 1370 controls said TP device 1380 from its remote display 1374 1372 of that rendered interface window, and a user's inputs 1372 1373 1375 are communicated 1376 1388 to said device's RCP 1388 1384 1382 1381. As resulting and continuing steps after using each said input 1375 1382, said device's interface 1381 is processed and updated 1383, said updated interface is communicated by the device 1384 1388 to the URC 1376 where the updated interface is displayed 1374 1372 and ready for further user inputs 1372 1373 1375—in the same continuous process as if the device's interface were being used locally.

In some examples for a particular device (such as in some examples a TP subsidiary device 1387, and in some examples and AID/AOD 1386) a URC 1370 may load a RCTP (Remote-Control Teleportal) from its storage 1379, run said RCTP for that device by means of the URC's processor 1377 and memory 1378, utilize communications 1376 1388 to control a TP device 1380 and thereby communicate with the particular subsidiary device or AID/AOD under control, display said RCTP on the URC's display screen 1372 1374, accept user inputs 1372 1373 1375 to said RCTP by means described elsewhere, and communicate 1376 1388 said user inputs to control said TP device 1380. In some examples a URC 1370 and for a particular device (such as in some examples a TP subsidiary device 1387, and in some examples and AID/AOD 1386) a URC may load a VTP (Virtual Teleportal) from its storage 1379, run said VTP by means of the URC's processor 1377 and memory 1378, utilize communications 1376 1388 to control a TP device 1380 and thereby communicate with a subsidiary device or an AID/AOD under control, display said VTP on the URC's display screen 1372 1374, accept user inputs 1372 1373 1375 to said VTP by means described elsewhere, and communicate 1376 1388 said user inputs to control said TP device 1380. In some examples for a particular device such as in some examples a TP subsidiary device 1387, a URC 1370 may display the part of a TP device's interface 1380 1381 that controls said TP subsidiary device 1387; such as in that example the TP device 1380 runs a RCTP that controls the subsidiary device 1387, and the URC displays the TP device's RCTP so the user can control the RCTP and subsidiary device by means of the URC 1370. In some examples a direct display of a device's interface may be less effective, even with translation of commands (as described elsewhere), such as in some examples for various types of TP subsidiary devices 1387, and in some examples for various types of AIDs/AODs 1386.

Remote control of some Subsidiary Devices 1387 (by means such as an RCTP), and/or by some AIDs/AODs 1386 (by means such as a VTP): In some examples a TP device is used to control some of one or a plurality of subsidiary devices by means of RCTP (Remote Control Teleportaling); in some examples said TP device's interface processing 1384 1383 includes the capability to translate one or a plurality of commands for a subsidiary device 1387 or for an AID/AOD 1386 as described in 1322 1333 1334 FIG. 35 and elsewhere, and display those translated commands as if they were a TP device interface such as described herein 1381 1383 1384, in FIGS. 183 through 187 and elsewhere. Therefore in some examples, the interface to control some of a subsidiary device 1387 or some of an AID/AOD 1386 is processed to appear the same as or similar to a TP device interface 1383 as if they were a TP device. Furthermore, in some examples that translated and mapped TP device interface 1383 is communicated 1384 1388 to a URC 1376—so that a URC 1370 1371 may control a TP device 1381 1385 in some examples, a subsidiary device 1387 in some examples, or an AID/AOD 1386 in some examples. In some examples extracting the control and navigation components and/or commands that match a TP device interface and presenting them on the remote control's display similar to a TP device's interface produces a wireless connection and an interactive remote control display of those commands that may be executed on a subsidiary device 1387 or on an AID/AOD 1386. When a user employs the URC 1370 1371, it operates through the RCP 1380 and its command translation to remotely control some of a subsidiary device 1387 or some of an AID/AOD 1386. Therefore, without constructing an "intelligent" remote control device or system, this provides some remote control over one or a plurality of devices through a scalable system of interactive interface extension.

Turning now to FIG. 37, "Universal Remote Control Interface (URCI)," in some examples a device is turned on 1350 (such as described in 1380 and elsewhere) and said device is waiting for a URC to send its ID or its user's input(s). To start discovering and connecting to devices 1380 a URC 1370 must be turned on, at which point the default is for the URC's communications 1376 to broadcast its last used user ID as it discovery command 1351. Optionally, a user may select a different identity 1352 for a URC 1351 (as described elsewhere), and optionally one or a plurality of said user's identities may require authentication (as described elsewhere). Optionally, turning on a URC may have a default setting to require identity selection 1352 and authentication 1352 to prevent taking control of a secure device by means of its URC. Devices (such as an enabled and configured TP device 1380 in some examples) that receive the communicated discovery command communicate a response 1388 that is received by the URC 1353. In some examples said discovery process 1351 1352 1353 1354 occurs automatically for each discovered device; in some examples said discovery process may have one or a plurality of errors 1354 in which case AKM instructions (Active Knowledge Machine guidance, as described elsewhere) for manual discovery and connection may be displayed in some examples on the URC's screen 1354 1370, and in some examples on the device's screen 1354 1380. This discovery and communication process 1351 1352 1353 1354 repeats until the available devices have been discovered and subsequent preparation steps have been performed (1355 1356 1357 1358 as described below). Thereafter, previously discovered devices do not need to be rediscovered when they are used. In addition, said URC periodically broadcasts to discover new devices 1351. Also additionally, said user may choose a different identity 1352, in which case said URC broadcasts 1351 to discover devices appropriate for that identity. Also additionally, said user may add a plurality of identities for simultaneous use 1352, in which case said URC broadcasts 1351 to discover devices appropriate for that user's current set of open identities.

URC display of a device: A device's response 1353 may optionally cause a URC to display in some examples the newly connected device's name 1354, in some examples the device's manufacturer's logo 1354, in some examples a list of controllable functions for user selection 1354 (such as if an LTP in some examples can open one or a plurality of SPLS's 1354, in some examples open one or a plurality of focused connections 1354, in some examples watch one or a plurality of broadcasts 1354 by selecting between a plurality of sources, in some examples play a pre-recorded DVD movie 1354, in some examples provide other functions 1354), etc. Optionally, in some examples one or a plurality of portions of said initial or subsequent display (such as in some examples a manufacturer's logo, in some examples the device's name, in some examples the list of controllable features available, in some examples other information or video) may be communicated 1388 from said controlled device's storage; in some examples one or a plurality of portions of said initial or subsequent displays may be pre-stored on said URC 1379 and displayed 1372 1374 from said URC's storage 1379; in some examples one or a plurality of portions of said initial or subsequent displays may be stored remotely and retrieved by said controlled device 1380, then downloaded and communicated 1388 to said URC 1376 and displayed by said URC 1354 1372 1374.

Device selection (list, interface, navigation, etc.): In some examples as a device is discovered and connected 1351 1352 1353 1354 it is added to a device list 1355 of one or a plurality of controllable devices that may be accessed at any time to select a device to control 1360, and when said device list is accessed 1355 it is displayed on the URC 1372 1374 so that a user can select the desired device to control 1360. In some examples said device list 1355 is text; in some examples said device list 1355 is graphical icons; in some examples said device list 1355 is hypertext links; in some examples said device list 1355 is a menu; in some examples said device list 1355 is an interface widget (such as a graphical map, a pull-down list or another type of widget interface); in some examples said device list 1355 and device selection 1360 is provided by other navigation and/or other interface means. In some examples said device list 1355 includes too many devices to fit on one URC screen, and in this case various types of known navigation may be used such as in some examples multiple URC screens with navigation between the screens 1355; in some examples devices may be grouped in device categories (such as in some examples categories such as TP devices, PCs/computers, other subsidiary electronic devices, AIDs/AODs, etc.) so that one selection screen 1355 utilizes a hierarchy of categories and each category's list of devices; in some examples other means for a device selection interface and navigation may be employed to find and select a larger number of devices.

Device Interface communications and use: In some examples as each device is added to said device list 1355 it's Device Interface (herein DI) is downloaded 1356 to the URC and stored in memory 1378 so that said DI is immediately available to be displayed 1361 as soon as a specific device is selected 1360. In some examples said DI is downloaded from a device 1357; in some examples said DI is downloaded from another source 1358; in some examples parts of said DI have been previously downloaded to the URC (such as in some examples a manufacturer's logo, in some examples a list of controllable device features that may be selected, and in some examples other data) and is stored 1379 in said URC for repeated uses over time. As described elsewhere, in some examples as said DI is used 1361 1369 1362 it is displayed on the URC 1372 1374; in some examples a user interacts with said DI 1362 on the URC by means such as a touchscreen 1372, or buttons 1373, or any type of input 1375 or interaction; in some examples the user's input(s) are communicated 1363 by means of URC communications 1376 to the controlled device's communications 1388; in some examples the user's input or command is performed by the controlled device 1384 1382; in some examples the controlled device's interface is (optionally) updated 1381 1383 by processing means described elsewhere (because in some examples an operation may only be started and stopped such as by selecting a play or pause button without needing to update the interface, while in some examples an operation may be changed such as by displaying an EPG [Electronic Program Guide] to end one broadcast by choosing a different broadcast and start playing it); in some examples the updated DI is communicated by communications on the controlled device 1384 1388 and received by the URC's communications 1376; in some examples an entirely updated DI is displayed 1374 1372 for use on the URC as needed 1365 1362, while in some examples secondary information is all that is updated such as adding information relating to a current function (such as in some examples the title of a movie that is being watched, or in some examples the name and background data of the identity in a focused connection).

Subsidiary devices and AIDs/AODs: In some examples a device is a subsidiary device 1387 or an AID/AOD 1386, then each step in this continuous control process 1369 1362 1363 1364 1365 is performed by utilizing command translation and interface means described elsewhere, with the result that in some cases very little control 1369 is possible, in some cases some features may be controlled 1369 but other features are not available, and in some cases considerable control 1369 may be used from a URC. In some examples a device is a subsidiary device 1387 or an AID/AOD 1386, then each step in this continuous control process 1369 1362 1363 1364 1365 is performed by utilizing RCTP means or VTP means described elsewhere and displaying said RCTP interface (in a single whole screen or in segmented parts), or VTP interface (in a single whole screen or in segmented parts), in the interface window 1372 on the URC 1371 1370, with the result that in some cases very little control 1369 is possible, in some cases some features may be controlled 1369 but other features are not available, and in some cases considerable control 1369 may be used from a URC.

Advertising and marketing: In some examples the URC's 1371 display 1372 may be updated with marketing or advertising messages such as in some examples each device vendor offering newer or upgraded models for sale: in some examples third-party retailers offering competing devices for sale; or in some examples behavioral tracking identifying a user's task(s) and offering products or services that fit said user's needs. In some examples said advertising and marketing process is attached to an external selling service or system that analyzes said data and provides specific advertisements that in some examples are based on the user's needs, in some examples are based on the user's context of use, and in some examples are based on what the vendor is trying to sell. In some examples this updating process 1369 (whether in some examples it is based upon using a controlled device 1380 1381 with a URC 1370 1371, or in some examples it is based on advertising and marketing) is repeated continuously 1362 1363 1364 1365 for each user input on each device selected.

Other high-level selections: In some examples a user selects a different device to use 1366 by using components of the URC interface 1372 1374 to display the list of controllable devices 1355 and selecting a different controllable device 1360, which has been discovered previously 1353 and had its DI downloaded 1356, so that when selected 1360 said new device's DI is immediately available for display and use 1361 four the available functions that may be controlled from the URC 1369 1362 1363 1364 1365. In some examples a user connects to a new or remote device 1367 by coming into range of it and automatically discovering it 1368 1351 1353 1354; while in some examples a user connects to a new or remote device 1367 by manually connecting to it 1368 1351 1353 1354 with the URC (such as in some examples a TP device 1380, in some examples a TP subsidiary device 1387, in some examples an AID/AOD 1386, or in some examples another type of device).

CONSTRUCTED DIGITAL REALITIES (RTPs AND OTHER TP DEVICES): A world with Teleportal devices includes Remote Teleportals (herein RTPs)—which comprise Teleportal devices in a plurality of fixed and mobile locations to view those physical locations, provide live viewing of an RTP location(s), (optional) two-way communications with that place(s), gather various kinds of data from said place(s), and transform one or a plurality of RTP places' physical realities into multiple types of broadcasted and/or recorded digital realities.

In some examples RTPs extend and expand the current growth of GIS (Geographic Information Systems) and augmented reality. These current and emerging technologies include GPS (Geographic Positioning Systems), turn by turn directions, Google streetview, augmented maps that identify places we want to find, and many more new and emerging services such as pointing a smart phone's camera at a landmark and having Augmented Reality data (such as a restaurant menu, another customer's comments or a landmark's Wikipedia entry) displayed automatically. Together these are creating a "knowing world" with wireless services and systems that provide route guidance, information, and answers at many locations along the way. In such a world, RTP's are just one more eye to find the same destination to which everyone is traveling.

That "knowing world" may not be the biggest or the best prize. While those who live in it will be safer and more informed this will be a paternalistic world whose systems turn its users into bystanders and observers even while they travel through their guided and information-rich physical environment. Instead of discovering, interacting and deciding or creating at every step, they are led turn-by-turn through the authorized ways of how to go everywhere, told the approved information about what they are seeing, and directed to what they should see and know during their journey. Their structured world will take them to far worse destinations than what their goal seem to be at first. In the end a "knowing world" will organize the world's people—it is the people who will be directed, structured and known—as they are turned into sleepwalkers who are herded through a reality they don't own or control, guided to destinations that are curated and presented as if it were the only world in which they can and should live.

In some examples, however, Remote Teleportals provide new types of systems for constructing one or a plurality of digital realities out of our physical reality and sometimes beyond it, in addition to providing the standard live or augmented views of each physical place. In some examples multiple constructed realities are simultaneously broadcast from a single RTP's fixed or mobile locations, so that those who view that location remotely (as well as those who are in that place and view it digitally) can enjoy it as it is—and switch immediately to one or a plurality of creatively altered digital realities, according to the desires and tastes of one or a plurality of digital creators.

As will be demonstrated, the potentials of these multiple "digital realities" may be more dynamic, dramatic, artistic, fertile, inspired, visionary, original and "cool" than the "physical reality" they replace. In a brief summary, an RTP (as well as other TP device processing that may also be broadcast, such as LTP's and MTP's that are mobile) provide means to turn physical reality into a broadcasted stage, with tools that one or a plurality of creative imaginations can use to transform the ordinary into a plurality of digital versions of reality that anyone can choose to enjoy or alter further, rather than be guided through by today's GIS and augmented reality systems. These RTP digital realities are not under any type of control, are not curated, nor are they paternalistic. Rather than guiding us, they give us the freedom to represent reality in any way we want.

Each has different types of value: Today's emerging GIS, GPS and augmented reality systems enhance physical reality and RTPs can show that. In addition, RTPs also diverge from physical reality and provide means to transform the world—one place and one vision at a time—into a plurality of digital realities that might make the world into a plurality of more interesting, entertaining compelling, or powerful visions of reality than existed before.

Some examples include: Art and music realities (Artists and musicians can add overlays to locations, adding sculpture gardens, static images, dynamically moving artworks, redecorated buildings, creative digital interactions, musical themes and much more to numerous locations. Services can randomize these overlays and additions with various themed templates, allowing numerous artists to transform multiple physical places from the ordinary into the extraordinary.); Graffiti realities (Graffiti artists and edgy musicians can add overlays and substitutions to locations, turning the world upside with their divergent creations.); A living, natural restored reality (Transformative programs could allow environmentalists to GPS an outdoor location, identify its natural plant and animal species, then overlay a fully restored scene over the current [usually badly managed] physical location—showing what it would look like if its natural plants and animals were restored to their full populations with that place's natural carrying capacity—then periodically switching back and forth to show the contrast between what nature would produce and that place after it was "civilized"); Events (Couple fixed or mobile RTPs with events, and broadcast digital events with accessible digital presences [such as live, recorded, or both] for interested audiences, as described elsewhere in more detail.); Alerts realities (Couple various types of RTP sensors and systems with digital alerts so a plurality of "alerts channels" auto-display the types of events different people would like to see wherever they appear, as soon as they happen anywhere. Sound-based channels can jump to the latest location based on a type of sound such as guns firing [violent crimes, political repressions, firefights in war zones, etc.], car accidents, sirens or alarms, the sound of a person screaming, or more.); Celebrities realities (Identity-based channels can jump to sightings of celebrities, political leaders, newsmakers, etc. [who are placed on face recognition "white lists"] by those who use templates and identifiers to create one or a plurality of "celebrity alert channels," "politician alert channels," "newsmaker alert channels," etc.); Persons realities (Identity-based channels can jump to sightings of the people in one's life such as family, friends, co-workers, business associates, etc. [who are placed on face recognition "white lists"] by those who use templates and identifiers to create one or a plurality of "family alert channels," "friends alert channels," "co-worker and business alert channels," etc.); Privacy realities (Couple RTP displays to face distortion software for those who put themselves on "privacy lists," so when they're in public they're covered up in "RTP digital realities."); Superhero realities (Extract "super heroes" from different types of movies or other sources, and extract sports figures in action from different types of sports events. Then cruise them through real locations, whether standing and walking, or performing their sport [such as catching a pass, running, snowboarding, skydiving, etc.], or performing daring missions [such as from superheroes sequences in movies and television]. These can be overlaid into real places, both as if they were normally present, and also as if they were performing sports there, or fighting villains and saving that world.); Healthy/Overstuffed realities (Reshape the people in a place by slimming those who are overweight so they are all height-weight proportionate, or inflate and parody the people so everyone there is obese.) Militarized/Demilitarized realities (Extract uniformed military and police, and their vehicles, and overlay them into locations so those places appear completely controlled police states. Or conversely, remove police from locations where they are normally positioned in force—to show how those places would look if they were not directly controlled by that government's police and military.); Revolutionary realities (Digitally alter weapons in dictatorships such as by putting flowers in gun barrels, revolutionary graffiti on tanks and military vehicles, overlaid revolutionary political slogans on government buildings, and more, with these digital realities processed abroad and broadcast into dictatorial countries.); Utopian realities (A variety ideals may be dynamically visualized and overlaid on everyday places to show what they would be like if each of those ideals came true.).

Multiple realities that produce new revenues and income: Audiences have value and can be monetized—and larger audiences earn more money—so the most popular digital realities, with larger audiences, are the most attractive for those who want to monetize all or parts of their RTP's outputs. An RTP's stream(s) can be received at one's local TP devices or on network devices, transformed into new digital realities, and rebroadcast—so one RTP's streams can produce multiple incomes, some of which are sharable with the RTP's source and some of which are unique to a creator. If wanted, a transformed stream(s) can be substituted for the original physical reality stream's at a source RTP(s) as if it were the real source (as described elsewhere), or broadcast as additional digital reality streams directly from a source RTP(s)—the revenues from those audiences can be turned into revenues for both the RTP owners who create the original streams, and for those who create compelling digital realities that attract audiences.

With RIP-constructed digital realities one or a plurality of RTP owners and additional creators could simultaneously redesign the physical world's live or recorded streams in a plurality of ways and broadcast the transformations from one or a plurality of sources such as RTP's, LTP's, MTP's, etc. Those in the audience(s) can choose the versions of reality they prefer and want—with the audience including both remote observers and those in that place but using their TP screens to be guided through one of its digital transformations.

Then, as each person uses a screen to go through the world they can choose which digital reality(ies) in which they want to live. The "knowing world" of GIS, GPS and augmented reality becomes just one option that can now compete with a plurality of constructed and imaginative digital realities—which can be designed to be more entertaining, more self-determined and more user-centered than the step-by-step "packaged reality" of GPS and augmented reality systems.

RTP-constructed digital realities may also be coupled with the ARM (Alternate Realities Machine, as described elsewhere) so that each person sets their own boundaries of what they want to include and exclude from their self-chosen "world(s)" (as described elswehre). The ARM's personal boundaries prioritize (include) what a recipient wants, block or diminish what a recipient does not want, and adds additional capabilities such as paywalls (which require those who want a person's attention to pay for that attention or be blocked instead), and protection (as described elsewhere).

RTP-constructed digital realities may also be coupled with Governances (as described elsewhere) so that groups may collectively construct digital realities (and optionally set their members' ARM boundaries) to fit each type of digital reality they choose to create (such as the three example governances described herein: IndividualISM's that expand self-directed personal freedoms, CorporatISM's that sell comprehensive solutions like entire lifestyles and living standards, and WorldISM's that support collective actions [like environmentalism] that transcend nation-state borders).

Taken together, it is clear that RTP processes of constructing digital realities have some differences from physical presence and GPS/augmented reality systems, especially since RTP's stream much more than "live" reality—RTP's may stream digital realities that may be altered in a plurality of locations by a plurality of creative imaginations—each for their own different purposes—and then (optionally) substituted and streamed as if their alteration(s) were the real source. Those who receive either "live" or constructed digital realities may also alter the received digital realities further during their presentation, if they impose their own self-selected boundaries during reception and local presentation by means such as the ARM (Alternate Realities Machine), governances boundaries, etc. as described elsewhere. Some examples of alterations during reception and presentation include prioritizing what each receiver desires, excluding what each receiver does not want, and applying other filters such as a Paywall so that receivers earn income for providing their scarce attention to specific added components such as to a specific product, brand or organization (that may be added during creation or during reception).

Therefore in some examples a meta-view of digital reality includes both the construction of a digital reality(ies) to suit varying goals, entertainments, desires, envisioned worlds, etc.; and also the filtering and altered presentation of said "real" and also digital realities as part of receiving them, so that a combination of a real place, creative digital reality constructions, and receivers' boundaries and alterations are simultaneous co-participants in creating the final digital reality(ies) experienced and enjoyed—with multiple monetization opportunities for multiple participants in this (value creation) chain. In combination with other capabilities described herein, RTP constructed digital realities are a way to grow beyond physical limits by providing devices, tools, resources and systems so that a plurality of creators and receivers may help choose, construct, live in and earn monies from any digital realities they prefer to ordinary physical reality. Over time, a plurality of constructed digital realities may be preferred to the ordinary physical world and may in some examples provide greater monetization opportunities and revenues for more participants (including recipients) than a controlled and "packaged" physical reality. If they choose, a plurality may try to shatter the glass ceiling between who they are and what they aspire to become by bringing the world they desire to (digital) "life," then live their lives as they would like to "see themselves," or perhaps in a simpler description, create the digital identities they would like to become and live the one or plurality of digital lifestyles they prefer.

Instead of strait-jacketed GPS and augmented reality systems that turn people into organized sleepwalkers who are herded through a curated and "knowing" world, some who think for themselves may attempt a breakaway and envision both their dreams and how they can become the independent actors who create and journey through digital realities that support their dreams. They may define or choose the constructed digital reality(ies) they want, instead of passing through a pre-defined physical reality that controls itself and them at the same time.

Figure 38:
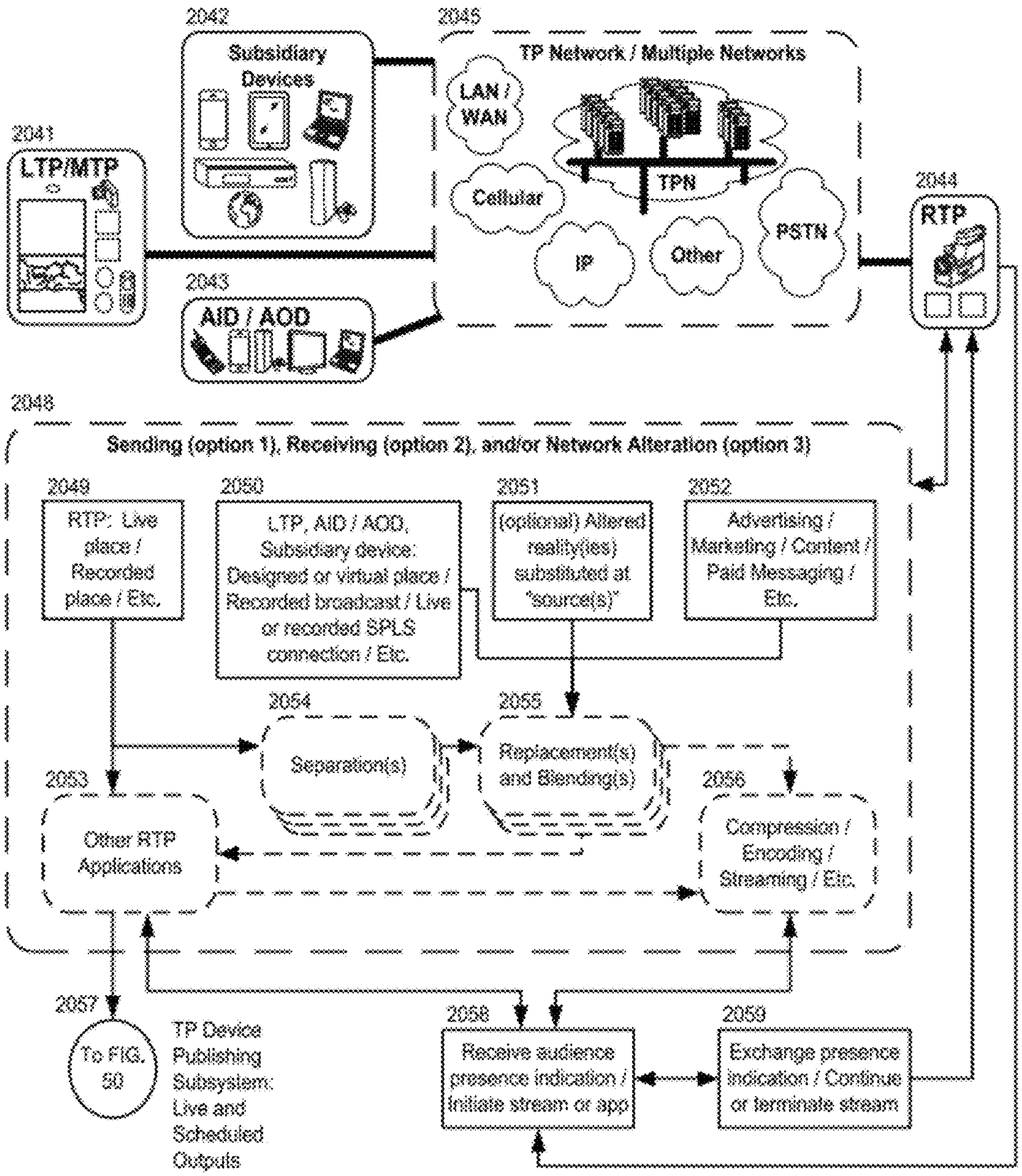
FIG. 38 is a pictorial block diagram showing some examples of the construction of digital realities, in this example by a Remote Teleportal.
Figure 39:
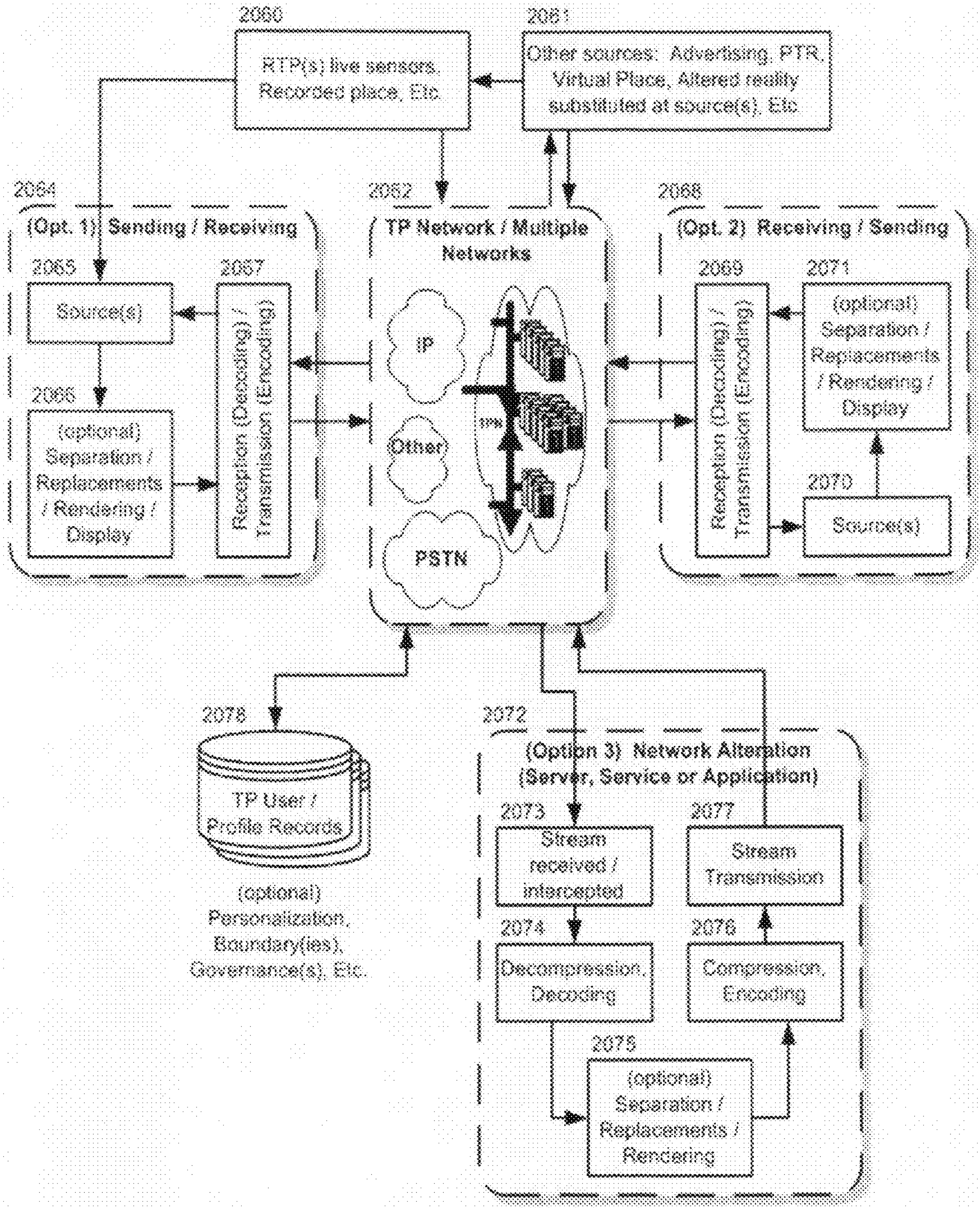
FIG. 39 is a block diagram showing some examples of the construction of a digital reality, and its subsequent reconstructions by a plurality of devices, including utilizing network interception.
Figure 40:
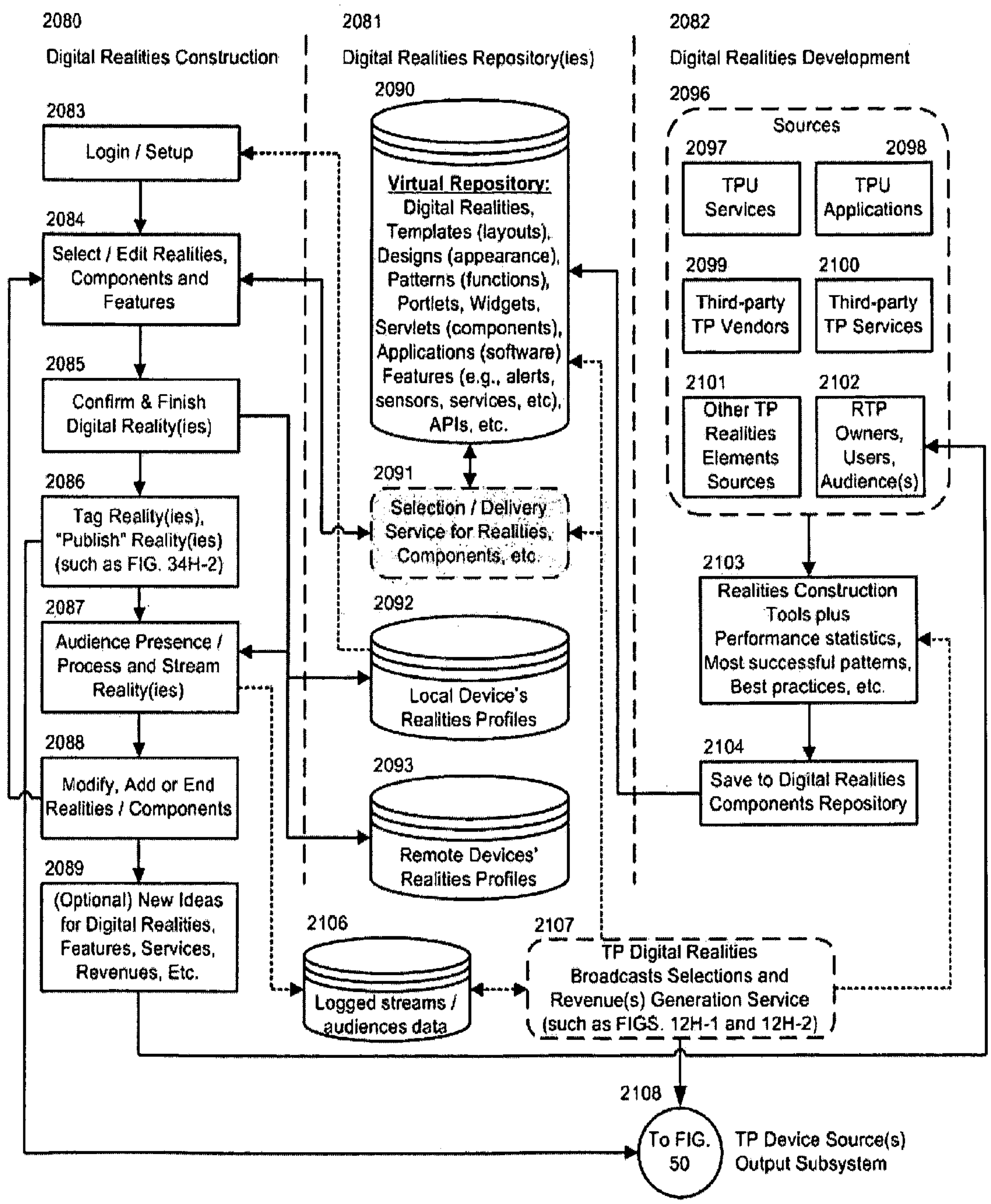
FIG. 40 is a block diagram showing some examples of digital realities construction processes, resource sources, and resources.
Figure 41:
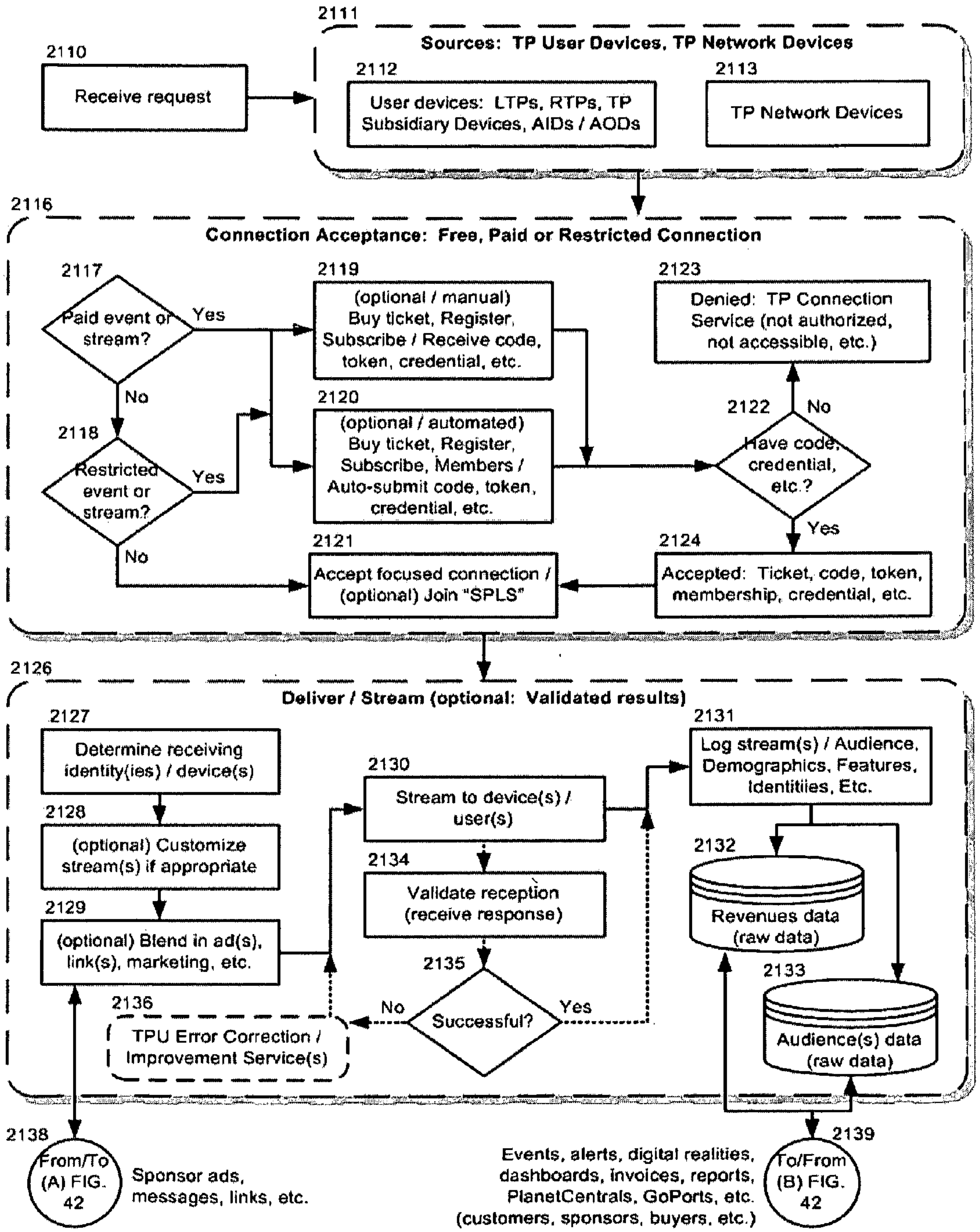
FIG. 41 is a flow chart showing some examples of procedures for broadcasting digital realities, monetizing broadcasted digital realities, and validating monetization steps in order to receive revenues.
Figure 42:
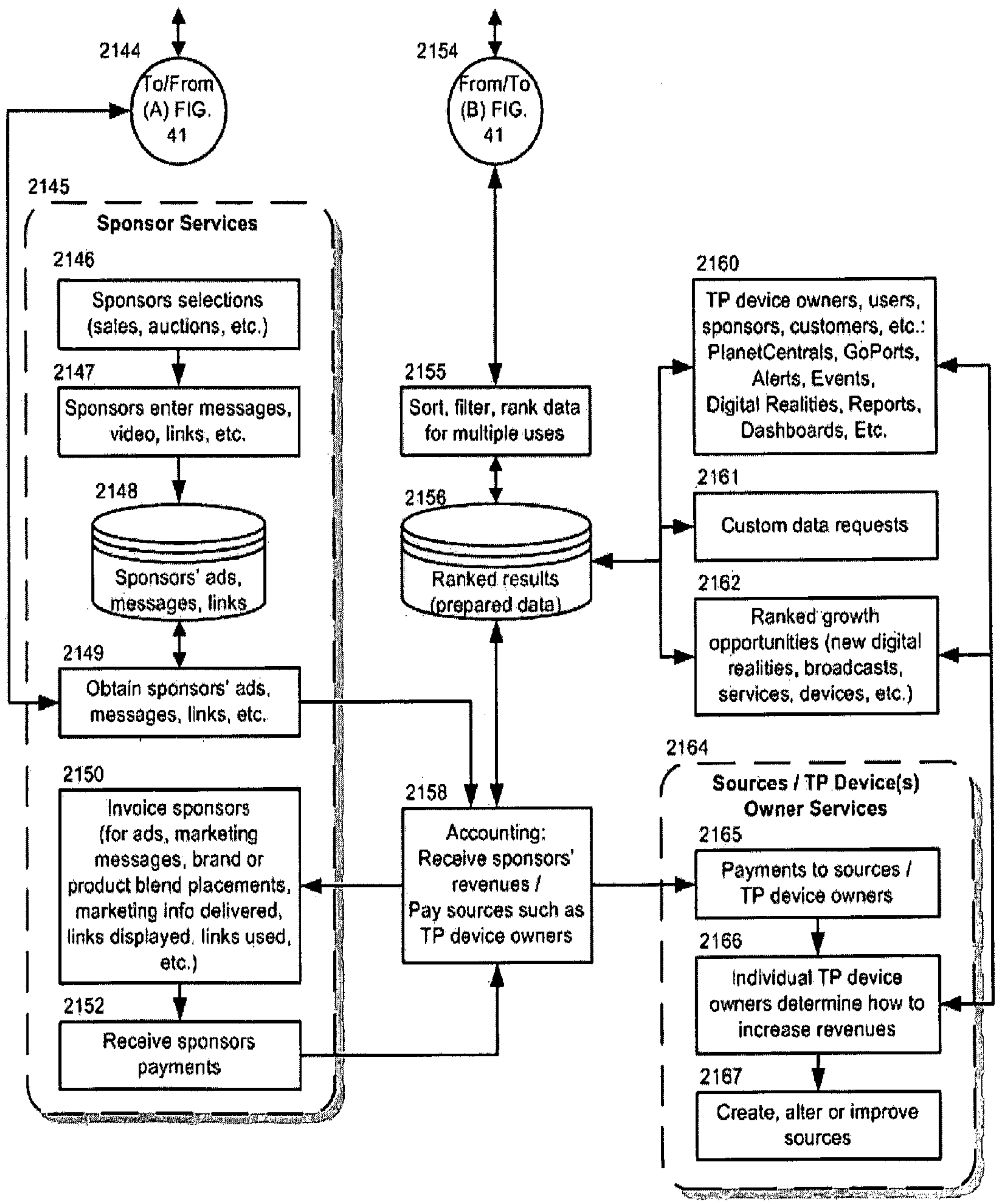
FIG. 42 is a flow chart showing some examples of procedures for sponsoring (such as advertising) on constructed digital realities, receiving data from broadcasted digital realities, collecting monies from sponsors, and providing growth information and systems to creators/broadcasters of digital realities.
Figure 43:
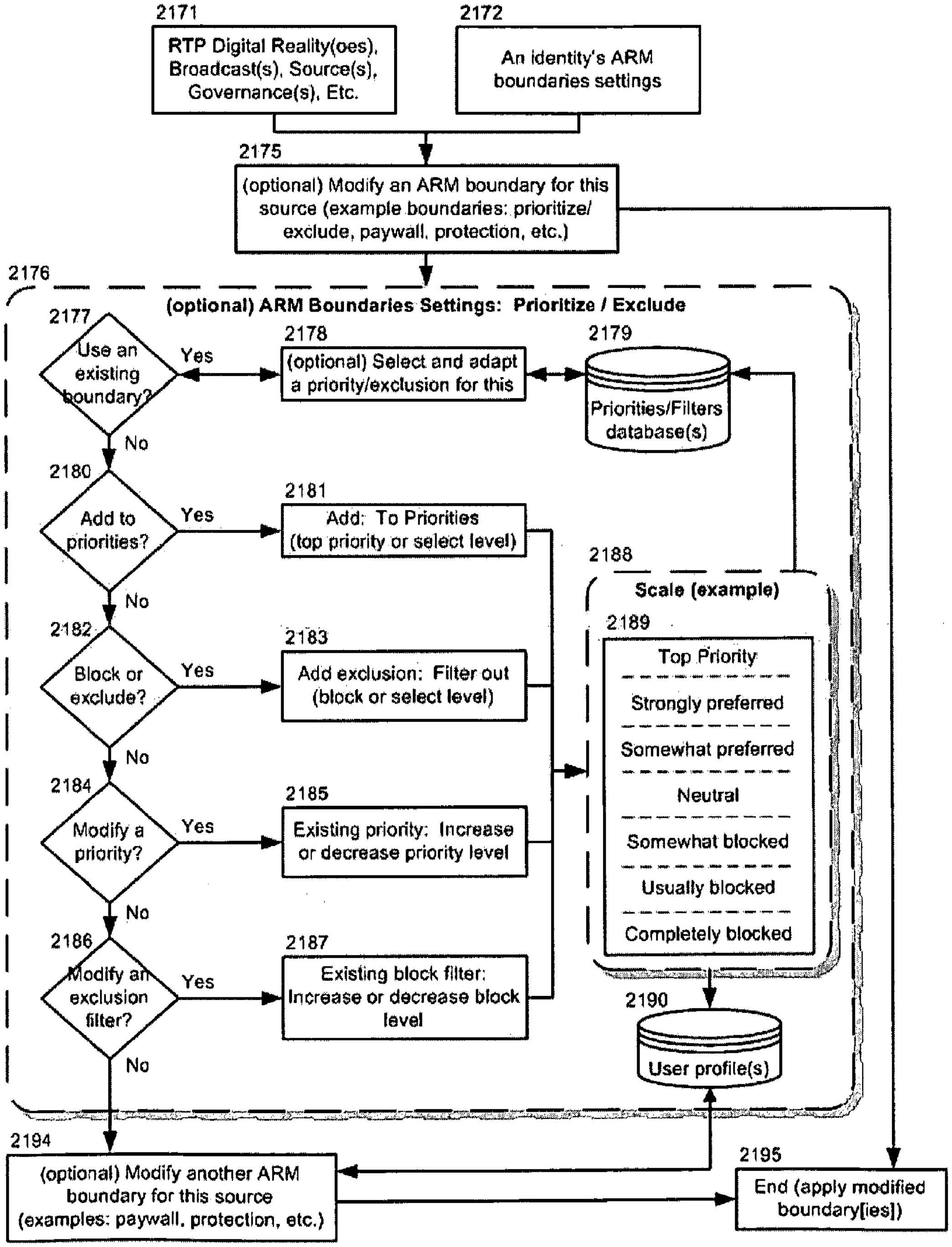
FIG. 43 is a flow chart showing some examples of procedures for integrating constructed digital realities with ARM boundaries management.

RTP processing: Together FIGS. 38 through 40 illustrate some examples of RTP processing including processing within a single RTP; a plurality of locations where the processing of RTP data may be performed; and resources that may be created and used to construct digital realities (as well as expand their use and increase their revenues); similar processes for constructing digital realities may in some examples be employed by other TP devices. Together FIGS. 41 through 42 illustrate some examples of deriving success metrics from digital realities and utilizing them for goals such as monetization, their rate of use and growth, etc. In addition, FIG. 43 illustrates some examples for using digital realities in ARM (Alternate Realities Machine) boundaries settings.

FIG. 38, "RTP Processing—Digital Realities": In some examples RTPs (Remote Teleportals) are TP devices that contain both sensors and sufficient processing power to construct and deliver a plurality of synthesized digital realities under the control of one or a plurality of remote users. Much more than WebCams or surveillance systems, RTPs utilize live and recorded data to perform one or a plurality of separations, replacements, blendings, compression, encoding, streaming, etc. so that those who view that RTP location(s) remotely can enjoy it either as is, or switch immediately to one or a plurality of creatively altered digital realities, according to the desires and tastes of one or a plurality of digital creators. Each different synthesized digital reality can be turned on or off based upon audience presence indications so that numerous types of digital realities can be available for real-time construction, streaming and use as soon as audience members select each one, with that digital reality turned off and stored as "available" when no audience members are utilizing it. In addition these examples of constructing digital realities may in some examples be performed by other networked electronic devices such as in some examples Local Teleportals, in some examples Mobile Teleportals, in some examples network servers or applications, and in some examples other devices or means described elsewhere.

FIG. 39, "RTP Processing Locations": In some examples some or all RTP processing is performed by an RTP device that gathers local data, then in some examples broadcasts said data, and in some examples synthesizes one or a plurality of digital realities (as described elsewhere) and broadcasts, communicates and or records said synthesized digital reality (ies). In some examples a receiving TP device (such as an LTP or an MTP) receives, records and/or displays said RTP data which in some examples is by live streaming of actual reality or one or a plurality of digital realities that are synthesized by an RTP; and after reception said receiving TP device can process the RTP reception to synthesize different or additional digital realities that may or may not include additional live or recorded people; which may then be broadcast in some examples, recorded in some examples, shared within a focused connection in some examples, or utilized in any other known manner. In some examples said RTP data or re-processed TP data (herein received data) are received or intercepted on a network (in some examples by a server, in some examples by an application, in some examples by a service, or in some examples by another network means); and in some examples said network receiver processes said received data to synthesize different or additional digital realities that may or may not include additional live or recorded people; which may then be broadcast in some examples, recorded in some examples, communicated in some examples, or utilized in any other known manner (including transmitting said received and altered data as if it were the original RTP data or TP data from the original RTP or TP source). In some examples RTP processing is distributed between two or a plurality of RTP and/or TP devices and/or third-parties that are connected by means of one or a plurality of networks. In some examples RTP processing and/or synthesized digital realities are personalized to individual recipients; and in some examples RTP processing is personalized to groups of recipients. When personalized, synthesized digital realities enable different recipients to see differently processed and differently constructed video and audio including in some examples different advertisements, and some examples different people, in some examples different buildings with different logos and brand names, and in some examples other different components—therefore, in some examples digital reality is a constructed process that is based in part on who each recipient is and his or her interests, boundary settings, etc.

FIG. 40, "Digital Realities Construction/Resources": In some examples resources are created, stored, retrieved and utilized for constructing digital realities; in some examples by copying the most popular and highest earning digital realities and/or components of digital realities; in some examples by providing means for creators of digital realities to access tools, templates and other resources to accelerate their construction; in some examples identifying the best sources for components to develop an improved new and better digital realities efficiently; and in some examples to provide users and customers with a prioritized list of the best digital realities. Said construction and resources process is flexible and modular so it can include new technologies, new vendors, new digital reality creators, etc. to accelerate the advancement and distribution of the best new digital realities constructs.

FIG. 41 and FIG. 42, "TP Devices' Digital Realities, Events, Broadcasts, Etc. and Revenues": In some examples requests for digital realities are received and processed by a plurality of media, tools, resources, etc. In some examples said requestors may or may not be permitted to receive, join, share, etc. a specific digital reality based upon whether it is free, paid such as by purchasing a ticket for subscription, for group members only, or some other requirement. In some examples after acceptance a digital reality may be streamed or it may be customized for said recipient or device such as by blending in content, objects, etc. In some examples the receipt and use of the digital reality is validated and/or logged in order to provide revenue generating data such as reception, audience information, demographics, features used, etc. In some examples sponsor services enable sponsors to place advertising, marketing or direct selling within one or a plurality of digital realities, including in some examples logging the delivery of said sponsor data, In some examples logging and one or a plurality of databases records the utilization of said sponsor data by one or a plurality of recipients, and in some examples reports these data directly to the appropriate sponsors. In some examples logged and stored data is employed to provide digital reality creators with improved audience size, revenue and other opportunities information when constructing or editing digital realities—to enable the advancement of digital realities with greater growth and faster advances in the directions that produce the highest levels of interest, use, revenues, audiences, and other metrics. In some examples accounting systems invoice sponsors, receive sponsors payments, determine what to pay device owners and/or digital reality sources, make payments to sources and/or device owners, report individual data on individual accounts, and aggregate data so that individual comparisons may be made with various revenue and audience size opportunities, and perform other accounting functions. In some examples any of these steps may be provided by one or a plurality of third parties.

FIG. 43, "Integration with ARM Boundaries Settings (Choose Your "Realities"): In some examples based on experiencing and/or learning about one or a plurality of digital realities, in some examples an identity can edit and alter one of its ARM (Alternate Realities Machine) boundary(ies); in some examples it can add a digital reality and make it a priority, or modify an existing digital reality's priority level; in some examples it can filter a digital reality by blocking or excluding it, or modify its filter level; in some examples it can add or remove a digital reality, or its components to a paywall, to protection, or to other boundaries settings. By means of learning about digital realities and varying one's boundaries based on what each person does or does not want, one identity's digital reality(ies) may be considerably different than another person's or another identity's digital realities.

Turning now to FIG. 38, "RTP Processing," in some examples an RTP 2044 (as described elsewhere) includes being remotely controlled by one or a plurality of controlling electronic devices 2041 2042 2043 (as described elsewhere) over one or a plurality of networks 2045 (as described elsewhere). In some examples RTP processes 2048 local content data gathered by said RTP 2044, including in some examples live video and audio of a place 2049, in some examples stored recordings of a place 2049, in some examples other local data gathered in real time or in recordings by said RTP's sensors 2049. In some examples RTP processing proceeds as described elsewhere (such as in FIG. 81 and elsewhere) to combine local content data with other content, persons, objects, events, advertising, etc. such that real-time replacements resulted in digitally modified places (with or without providing information that place has been modified). In some examples various parts of the foreground and/or background of said local content data may be replaced in whole or in part; and in some examples the RTP's local content data may be used to replace the foreground and/or background of a different place—again, with or without providing information that the local place and/or the different place have been digitally modified)—such that the constructed place may include components from one or more places, people, products, objects, buildings, advertising, etc. Furthermore, as described elsewhere "reality replacement" may be provided either by an individual's choice, as part of an educational class or an educational institution's presentation of itself, as a business service, as part of delivering an experience (such as at a theme park or any business), as part of constructing a brand's image, as part of a government's presentation of its services, etc.

FIG. 38 illustrates some examples for using an RTP to construct one or a plurality of digital realities (which is described in more detail elsewhere). In a sending option 2048 that includes constructing one or a plurality of digital realities, an RTP may gather local content data 2044 2049 (including in some examples live video and audio of a place 2049, in some examples stored recordings of a place 2049, in some examples other local data gathered in real time or in recordings by said RTP's sensors 2049); provide separation 2054 and replacement blending 2055 (which in some examples blends content from an LTP 2050, in some examples blends content from an AID/AOD 2050, in some examples blends content from a subsidiary device 2050, in some examples blends in parts of a designed or virtual place 2050, in some examples blends in components of a live or recorded SPLS connection 2050, in some examples blends in advertising 2052, in some examples blends in marketing 2052, in some examples blends in paid content 2052, in some examples blends in paid messaging 2052, in some examples blends in an altered reality 2051 that has been substituted at a source 2051 with or without providing information about said substitution, etc.); then stream it 2056 over one or a plurality of networks 2045 to others. In some examples the construction of one or a plurality of digital realities may in some examples be performed by other networked electronic devices such as in some examples Local Teleportals, in some examples Mobile Teleportals, in some examples network servers or applications, and in some examples other devices or means described elsewhere.

In a receiver(s) alteration option 2048 that includes constructing one or a plurality of digital realities, an RTP may gather local content data 2044 2049 (including in some examples live video and audio of a place 2049, in some examples stored recordings of a place 2049, in some examples other local data gathered in real time or in recordings by said RTP's sensors 2049); then stream it 2056 over one or a plurality of networks 2045 to others such as in some examples an LTP user 2041, in some examples an MTP user 2041, in some examples an AID/AOD user 2043, in some examples a TP subsidiary device user 2042, etc.; wherein one or a plurality of receivers' device(s) 2041 2042 2043 perform separation (such as 3621 in FIG. 81 and elsewhere) and replacement blending (3630 and elsewhere); then said receiver(s) 2041 2042 2043 stream their constructed digital reality (ies) over one or a plurality of networks 2045 to others.

In a network alteration option 2048 that includes constructing one or a plurality of digital realities, an RTP 2044 may gather local content data 2044 2049 (including in some examples live video and audio of a place 2049, in some examples stored recordings of a place 2049, in some examples other local data gathered in real time or in recordings by said RTP's sensors 2049); then stream it 2056 (without constructing a digital reality) over one or a plurality of networks 2045; wherein said RTP's 2044 2056 stream may be intercepted and a separate networked application, networked server and/or networked service may provide separation (such as 3621 in FIG. 81) and replacement blending (3630 and elsewhere); then said network application, server and/or service may stream its constructed digital reality(ies) over one or a plurality of networks 2045 to others.

Reconstructing and modifying digital realities: In a receiver(s) alteration option 2048 an RTP may construct one or a plurality of digital realities 2049 2054 2055 2050 2051 2052 2056 as described elsewhere, and stream it (them) over one or a plurality of networks 2056 2045; wherein one or a plurality of receivers' device(s) 2041 2042 2043 perform separation (such as 3621 in FIG. 81 and elsewhere) and replacement blending (3630 and elsewhere) to provide further alterations to said constructed digital reality(ies) that may include separation (such as 3621 in FIG. 81) and replacement blending (3630 and elsewhere); then said receiver(s) 2041 2042 2043 stream the reconstructed and modified digital reality(ies) over one or a plurality of networks 2045 to others. In a network alteration option 2048 an RTP may construct one or a plurality of digital realities 2049 2054 2055 2050 2051 2052 2056 as described elsewhere, and stream it (them) over one or a plurality of networks 2056 2045; wherein one or a plurality of said constructed reality(ies) stream(s) may be intercepted and a networked application, networked server and/or networked service may provide further alterations to said constructed digital reality(ies) that may include separation (such as 3621 in FIG. 81) and replacement blending (3630 and elsewhere); then said network application, server and/or service may stream the reconstructed and modified digital reality(ies) over one or a plurality of networks 2045 to others.

In some examples of a different kind of step, said constructed digital realities, and/or reconstructed and modified digital realities, may be substituted as a source 2051 (and 3627 in FIG. 81 and elsewhere) with or without providing information that said substitution has been made. In such a case, an expected "real" and live source may be replaced with an altered source 2051 3627 in some examples with clear and visible indication that said source has been transformed, but in some examples to provide a digitally altered reality as a hidden process without informing recipients of the transformation(s) and substitution(s).

In some examples an additional step is to apply RTP applications 2053 to said RTP streams 2056 and then publish said streams 2057 so that they may be found, enjoyed, used, etc. by others. In some examples said other applications 2053 include tagging with keywords 2053 2057, in some examples submitting streams 2056 to "finding" tools and services 2053 2057, in some examples submitting streams 2056 to "alerts services" 2053 2057, in some examples providing streams 2056 as broadcasts 2053 2057, in some examples recording streams 2053 2056 and scheduling said recordings 2053 2056 as scheduled broadcasts 2053 2057, etc. Similarly, the same types of applications may be applied to RTP streams that are processed by one or a plurality of receivers' device(s) 2041 2042 2043, and may also be applied to RTP streams that are processed by one or a plurality of separate networked application(s), networked server(s) and/or networked service(s). In some examples said other applications 2053 include known augmented reality applications that are not described herein; in some examples said other applications 2053 include known GPS location-aware services that are not described herein; in some examples said other applications 2053 include other types of services or applications that are not described herein.

In some examples said publishing 2057 may monetize both "live" RTP streams 2049 2056 and constructed digital realities 2044 2048 2049 2054 2050 2051 2052 2055 2056 (as described in FIG. 50 and elsewhere), there may be incentives to provide and deliver digital realities that are attractive, powerful and compelling for potentially wide use and enjoyment.

In some examples one or a plurality of RTPs 2044 2048 may each provide a plurality of "live" streams, streamed digital realities, and/or recorded "live" or digital realities. As a result said RTP 2044 2048 may not have sufficient resources to provide its component services and processing 2049 2044 2048 2049 2053 2054 2050 2051 2052 2055 2056; it may also have insufficient network bandwidth 2045 to deliver a plurality of simultaneous streams; it may also have insufficient capitalization to pay the equipment, maintenance and/or management costs of operation. With any of these or any other limiting factor(s) there is a need to focus said RTP's processing, bandwidth, management, etc. on its highest value operations.

In some examples a specific RTP application 2053 and/or a specific stream 2056 are initiated only when an appropriate audience or user presence indication 2058 is received 2053 2056. In some examples after an appropriate presence indication 2058 is received and the related RTP application 2053 or stream 2056 has been started 2058, said presence indication must be periodically renewed 2059 so that said application 2053 or stream 2056 are continued 2059. In some examples after an appropriate presence indication 2058 is received and the related RTP application 2053 or stream 2056 has been started 2058, said presence indication must be periodically renewed 2059 or else said application 2053 or stream 2056 timeout and are terminated 2059. In some examples said presence indication 2058 2059 is based upon ARTPM presence described elsewhere; in some examples said presence indication 2058 2059 is based upon any known presence technology, system, application, etc.

In some examples a plurality of RTP applications may run simultaneously 2053, and/or RTP "live" and constructed digital realities may be simultaneously streamed 2056, causing insufficient resources (as described elsewhere). In some examples an RTP application 2053 monitors and logs the total usage of each currently running RTP application 2053 (herein "Present Audience/Users 2058 2059"), and each current RTP stream 2056 (Present Audience/Users 2058 2059), to utilize said monitored data in allocating and prioritizing RTP resources 2044 2048 if and when they are insufficient. In some examples the utilization of said Present Audience/Users data 2058 2059 is pre-set based upon priorities such as the goals of the owner or manager (herein "owner") of said RTP (s) 2044 2048. In some examples the RTP's owner's priority is audience size 2058 2059 so that if said RTP has insufficient resources the first application and/or stream to be terminated will be the one with the smallest size (e.g., the lowest number in the current Present Audience/Users data 2058 2059); and if additional applications and/or streams must be terminated that will be done based on a "lowest number of audience members or users first" model. In some examples the RTP's owner's priority is revenue and income so that if said RTP has insufficient resources the first application and/or stream to be terminated will be the one that produces the smallest revenues (e.g., anything given away free will be terminated first); and if additional applications and/or streams must be terminated that will be done based on a "least revenue produced first" model. In some examples the RTP's owner's priority is a combination of audience size (such as for growth) and revenues so that if said RTP has insufficient resources first the free applications will be terminated (e.g., the free applications that have the lowest number in the current Present Audience/Users data 2058 2059); and if additional applications and/or streams must be terminated that will be done based on a model such as "lowest number of audience members or users first," then the smallest revenue producers next—until what is left includes the largest audiences (whether free or paid) with the streams and applications that produce the largest revenues.

RTP Processing Locations: Turning now to FIG. 39 in some examples one option is a sender 2064 which may be an RTP device as described elsewhere in more detail, or may be another type of Teleportal electronic device with sensors such as described elsewhere, or maybe another type of electronic device with sensors. In a brief summary said sensor(s) data is received 2065 2060 2067 (including in some examples live video and audio of a place 2060, in some examples stored recordings of a place 2060, in some examples other local data gathered in real time or from stored recordings by said sensors 2060); and in some examples includes data from a remote source(s) 2060 2061 2062 (including in some examples advertising 2061, in some examples PTR (Places, Tools, Resources) 2061, in some examples a virtual place[s] 2061, in some examples a digital reality substituted aa a source 2061, etc.) which in some examples is received by said sending device 2064 directly 2061 2060 2065, and in some examples is received by said sending device 2064 over one or a plurality of networks 2061 2062 2067 2065. Then in some examples separation 2066, blending 2066, replacements 2066, rendering 2066, encoding 2067, etc. are performed by said sender's device 2064; and the constructed output is streamed 2067 and/or transmitted 2067 over one or a plurality of networks 2062 to others, as well as (optionally) being displayed 2066 for said sender 2064. In some examples "live" source data from an RTP's sensors is streamed as received without further processing and the output is streamed 2067 and/or transmitted 2067 over one or a plurality of networks 2062 to others, as well as (optionally) being displayed 2066 for said sender 2064. In some examples the output 2066 (whether as received or after alteration[s]) receives processing from additional applications such as in some examples augmented reality, in some examples GPS location-aware data, etc. and the final output with additions is streamed 2067 and/or transmitted 2067 over one or a plurality of networks 2062 to others, as well as (optionally) being displayed 2066 with said additions for said sender 2064.

In some examples another option is a recipient 2068 as described elsewhere in more detail, but in a brief summary one or a plurality of sources 2064 2060 2072 2061 are received 2069 2070 (including in some examples live video and audio of a place 2060, in some examples stored recordings of a place 2060, in some examples other local data gathered in real time or from stored recordings by sensors 2060; in some examples includes advertising 2061, in some examples PTR (Places, Tools, Resources) 2061, in some examples a virtual place[s] 2061, in some examples a digital reality substituted aa a source 2061, etc.) which in some examples is received by said recipient 2068 over one or a plurality of networks 2064 2060 2072 2061 2062 2069 2070. In some examples one or a plurality of sources 2070 are displayed 2071 and used as received. In some examples separation 2071, blending 2071, replacements 2071, rendering 2071, encoding 2071, etc. are performed by said recipient's device 2068 and the constructed output 2071 is displayed 2071 and used. In some examples the output 2071 (whether as received or after alteration[s]) receives processing from additional applications such as in some examples augmented reality, in some examples GPS location-aware data, etc. and the final output with additions is streamed 2069 and/or transmitted 2069 over one or a plurality of networks 2062 to others, as well as (optionally) being displayed 2071 with said additions for said recipient 2068. In some examples the displayed output 2071 (whether as received or after alteration[s]) is streamed 2069 and/or transmitted 2069 over one or a plurality of networks 2062 to others.

In some examples another option is a network alteration 2072 as described elsewhere in more detail, but in a brief summary one or a plurality of sources 2064 2068 2060 2061 are received 2073 by a separate networked application, networked server and/or networked service; in some examples one or a plurality of sources 2064 2068 2060 2061 are intercepted 2073 with or without notification by a separate networked application, networked server and/or networked service. In some examples (whether said sources are received or intercepted) one or a plurality of steps such as decompression 2074, decoding 2074, separation 2075, blending 2075, replacements 2075, rendering 2075, encoding 2076, compression 2076, etc. are performed by said network application, server and/or service 2072 to produce constructed output 2076. In some examples said constructed output 2076 receives processing from additional applications such as in some examples augmented reality, in some examples GPS location-aware data, etc. In some examples said constructed output 2076 is streamed 2077 and/or transmitted 2077 over one or a plurality of networks 2062 to others. In some examples various types of network alterations 2072 may be performed for a plurality of reasons such as in some examples inserting paid advertising in a stream or background 2072, providing the same shared location appearance and/or content for all recipients such as at a demonstration or presentation 2072, to substitute an altered reality at a source 2072 2061, etc.

In some examples other options include one or a plurality of users'profile records 2078 such as in some examples for personalization 2078; in some examples to retrieve and utilize an identity's boundaries 2078 (including in some examples retrieving a user's priorities to include them in replacements 2066 2071 2075 and/or in display[s] 2066 2071 2075, in some examples retrieving advertisements 2061 that fit a user's Paywalls and displaying them for earning income, etc.); in some examples to include governance attributes 2078, governance sources 2078, governance criteria 2078, etc.; or in some examples for other purposes appropriate for a user's profile 2078 or records 2078.

Digital Realities Construction Resources and Advancement Processes: FIG. 40. "Digital Realities Construction Resources," illustrates processes of (1) in some examples creating new resources for digital realities construction; (2) in some examples constructing digital realities by copying the most popular and highest earning one(s); (3) in some examples providing means for creators of digital realities to quickly access tools, templates and other resources for constructing and implementing them rapidly; (4) in some examples quickly identifying and using the best digital realities as sources when constructing new digital realities, to learn from them and advance to newer and better digital realities at a faster pace—essentially, making it possible to develop and improve new and better digital realities efficiently; (5) in some examples providing users with consistent and predictable digital realities from a plurality of RTP sending sources, from a plurality of TP devices sources, from a plurality of network alteration sources, and from a plurality of other sources; etc. FIG. 40 illustrates how said processes are flexible, modular and consistent yet able to evolve to include new technologies, new vendors, and new digital reality creators so that a growing range of digital realities may be implemented—with a minimum of construction effort—so that numerous types of new digital realities may be created, added and streamed by both vendors and users.

In some examples a core process of the "Digital Realities Construction Resources" is to provide consistent high-level patterns 2081 2090, yet within each pattern provide easily added and potentially large improvements 2082 2096 2103 2104 in the ways digital realities are able to be constructed 2090 2091 2084. The sources of said improvements may be TPU (Teleportal Utility) Services 2097; TPU Applications 2098; large industry-leading vendors 2099 2100; new technology startups 2099 2100; various digital reality sources 2101; one or a plurality of RTP owners 2102, individual users 2102, digital reality audience members 2102, etc. The architecture provides capabilities so that each addition 2096 may be included 2103 2104 in one or a plurality of repositories 2090 and provided by one or a plurality of selection and delivery services 2091 (such as in some examples for selecting a type of digital reality 2091, in some examples for selecting and applying various elements of digital reality[ies] 2091 2090, and in some examples for selecting and applying elements so as to create new combinations and new digital realities 2091 2090) so that developers of new digital realities may use them to construct new digital realities 2084, or to modify or update existing digital realities 2088. This provides continuous improvement opportunities for digital realities to potentially become an accelerated creation of intuitive, rapidly maturing, increasingly familiar and stable digital realities that may be created and/or delivered by a plurality of types of devices, and used by growing audiences 2087 2106 2107 2108 who independently choose and enjoy the types of digital realities they prefer. Since audiences are valuable and can be monetized 2107 2108, the metrics and data on different digital realities 2087 2106 produces rankings that surface the most valuable digital realities 2107, and said rankings 2107 may be used when storing and selecting digital realities 2090 2091, and storing and selecting elements of digital realities 2090 2091—so that new and updated digital realities 2084 2088 may produce larger audiences 2087 2106 2107 2108 and larger incomes 2107.

In some examples said digital realities construction 2080 begins by logging in to a TP device as a specific identity 2083 or user 2083 and starting the creation of a new digital reality by running a setup application 2083 such as in some examples a wizard 2083 and in some examples a software program 2083. Said setup application 2083 determines if the DIU (Device In Use) has constructed other digital realities by means of their stored profile(s) 2092 and attributes 2092. If that is true, then said setup 2083 utilizes said previous digital realities settings 2092 as the default selections for creating a new digital reality, which includes said DIU's capabilities for constructing and delivering digital realities. If said DIU does not have other digital realities 2092, then said setup 2083 retrieves appropriate digital realities settings from appropriate virtualize repositories 2081 2091 2090 to provide an initial setup 2083. User may then edit said DIU's selection(s) 2091, element(s) 2091, etc. 2084.

In some examples said user then selects an appropriate type of digital reality 2091, and desired elements from virtual repositories 2091 by means of one or a plurality of selection and delivery services 2091. In some examples said selections 2091 include types of digital realities 2090, in some examples templates (layouts) 2090, in some examples designs (appearance) 2090, in some examples patterns (functions) 2090, in some examples in some examples portlets (components) 2090, in some examples widget (components) 2090, in some examples servlets (components) 2090, in some examples applications (software) 2090, in some examples features (such as alerts, sensors, services, etc.) 2090, in some examples APIs 2090, etc. In some examples after said selections have been made 2091 2090 and are displayed 2084, they are edited such as by choosing, arranging and editing said elements manually and individually 2084, and in some examples by one or a plurality of tools 2084 2096 2103 2104 2090 2091. In some examples after editing said selections 2084 a digital reality is confirmed by viewing and finished 2085 which includes saving them in the local device 2092, or in some examples saving them in an appropriate remote storage 2093 such as on the TP Network 2093. A specification of the digital reality's attributes and components is also saved 2092 2093 to provide (optional) default selections when another new digital reality is created 2083 for that device 2080 in the future. Alternatively, said digital reality's attributes and components 2092 2093 may provide its settings and attributes if that user or other users have similarly capable TP devices, so that this digital reality (such as its template, appearance, components, functions, settings, etc.) may be duplicated on a new TP device. In some examples when said digital reality is complete 2085 it can be tagged 2086 and published directly 2086 2108, or in some examples by means of data logging and a service that identifies the most knowledgeable digital realities 2106 2107 2108, such as described in FIG. 50 and FIG. 87 and elsewhere.

In some examples when said constructed digital reality (ies) 2085 are used 2087 data is captured as described elsewhere and stored 2106 such as in some examples to a metered data database 2106 that may include in some examples logging of streams, in some examples audience size data, in some examples audience demographics data, in some examples audience profile data, in some examples users' individual identification data, etc. If one or a plurality of these audience data are captured 2087 and recorded 2106 (such as which digital reality was used, audience data, each successfully metered revenue producing event associated with said digital reality, and [optionally] which user employed each event) then said metered data 2106 may be accessed and applied by a TP Digital Realities Broadcast Selections and Revenue(s) Generation Service 2107. Since audiences are valuable and can be monetized 2107 2108, the metrics and data on individual digital realities 2087 2106 may be employed in a range of known methods, systems, or applications to produce various types of revenues and income from the streaming and/or transmission of said digital realities, from advertising, from subscriptions, from memberships, from event tickets, or from other revenue sources.

In some examples when said digital reality is complete 2085 if needed or desired it may be modified 2083, edited 2083, updated 2083, or ended 2083 by means of the process described previously for selecting 2084 and editing 2084 a digital reality or its elements 2084 such as its template 2090, components 2090, features 2090, etc. This may be done as a normal part of updating or ending a digital reality because various elements 2090 associated with said digital reality may be updated, replaced or terminated from time to time. In addition, a differently designed or configured digital reality may produce larger audiences 2087 2106 2107, higher revenues 2107, etc. so that it may be advantageous to modify 2088 some part(s) of a digital reality or its elements.

In some examples the use of one or a plurality of digital realities 2087 may lead to new ideas in some examples by RTP owners 2102, in some examples by vendors 2102, in some examples by users of one or a plurality of digital realities 2102, in some examples by a digital reality's audience 2102, or in some examples by others who know of one or a plurality of digital realities. Said new ideas may include in some examples new types of digital realities 2089, in some examples improved elements 2089 2090 of digital realities, in some examples improved digital reality features 2089 2090, in some examples improved digital reality publishing 2086 2108, in some examples for introducing a new type of digital reality(ies), in some examples improved promotion or marketing opportunities 2087 2106 2107 2108, in some examples improved monetization or revenue generation methods or applications 2087 2106 2107 2108, in some examples new combinations of existing and new ideas into a new capability (ies) that may be delivered repetitively 2090 2091, in some examples other types of new ideas. In some examples said new ideas 2089 may be developed 2102 2096 2103 2104 2090 2091 as described elsewhere.

In some examples a related process is the creation 2082 and development 2082 of new digital realities, elements, tools, features and capabilities by a variety of sources that may include in some examples TPU Services 2097 and TPU Applications 2098 (Teleportal Utility Services and/or Applications may develop and deliver new types of digital realities 2090, or new digital realities elements 2090 that may be incorporated into realities construction tools 2103 2104, or saved directly to one or a plurality of repositories 2090, for selection and use 2084 in the construction of digital realities); in some examples Third-Party TP Vendors 2099 and/or Third Party TP Services 2100 (whether large industry-leading corporations or new small business startups, vendors of products or services may develop and deliver new digital realities elements 2090 that may be incorporated into realities construction tools 2103 2104, or saved directly to one or a plurality of repositories 2090, for selection and use 2084 in the construction of digital realities); in some examples other sources of elements 2101 (which may be adapted from standards-based components such as portlets, servlets, widgets, small applications, etc. that may in some examples be accessed by realities construction tools, and in some examples may be added to a virtual repository 2090); in some examples digital realities users 2102, audience members 2102, RTP owners who provide one or a plurality of digital realities 2102, or others may provide new ideas 2089 (such as for new types of digital realities, new features, new services, new revenues opportunities, etc.). These digital realities development improvements 2096 may be delivered to other digital realities creators 2084 by means previously described (the process for selecting and editing realities, components and features 2084; by means of a selection/delivery service for realities, components, etc. 2091; by means of a virtual repository[ies] 2090; etc.).

In some examples another related process is the TP Digital Realities Broadcasts Selections and Revenue(s) Generation Service 2107 which includes means for identifying and presenting the most popular and most used digital realities 2087 2106, and (optionally, where metered and logged) components and features of said digital realities 2087 2106, and (optionally, where metered and logged) be absolute or relative magnitude of revenues generated by various types of digital realities 2087 2106 or their components and features 2087 2106. Said data 2106 2107 may be provided in various ways such as in some examples statistics 2107, in some examples graphical visual illustrations 2107, in some examples best practices 2107; and in some examples said data 2106 2107 may be provided directly to said development tools 2103, in some examples may be provided during the use 2084 of a Selection/Delivery Service for Realities, Components, etc. 2091, and in some examples may be associated with the choice or use of individual elements from a virtual repository (ies) 2090. In some examples in each tool 2103, selection service 2091, repository 2090, etc. the types of digital realities or elements may be sorted so the first ones displayed are those that produce the most success 2087 2106 2107, and the last displayed are those that produce the least success 2087 2106 2107. As a result, providers of digital realities 2080 may improve their selection of resources 2081, and further development of continually advancing digital realities 2082, and publishing of their digital realities 2108, so that digital realities simultaneously provide the greatest benefits to both their providers and their users/audiences.

In some examples combinations may be provided for remote access and use such as providing one or a plurality of RTPs as a an externally controlled device(s) or service(s) so that others may construct digital realities 2083 2084 2091 2085 2086 2087 2106 2107 2108 2088 2089 2102 and deliver said digital realities 2087 for various audiences 2106 2107 with revenue sharing and income when audiences are monetized 2107 2108 by those additional digital realities creators. In such a case, users from a plurality of locations may create and stream one or a plurality of digital realities that have access to said RTP's plurality of sensors and sources (as described elsewhere). To accomplish this, and to provide this functionality as a capability of RTPs owned and provided by one or a plurality of corporate and/or individual owners, said owners may combine an RTP with TP sharing (as described elsewhere), or with RCTP (Remote Control Teleportaling), and also with digital realities creation tools 2082 2096 2103 2104, sources (as described elsewhere), and resources 2090—then publish this as a complete RTP remote digital realities broadcast resource 2090 2091 for shared creation and use. With these types of resulting devices and capabilities in one or a plurality of digital realities selection services 2091, remote users may access said RTPs to create multiple digital realities 2083 2084 2091 2085 to publish and attract audiences 2087 2106, so that those audiences may be monetized 2107 2108 and the resulting revenues shared.

When considering an overall view of Digital Realities Construction Resources, this is a substantial departure from typical product development which usually provides a static product design that remains fixed and is updated only periodically (such as every couple of years). In contrast, these methods and processes support self-determined improvement and advances processes that provide data on what is most successful and least successful to guide the creation and delivery of the best and most attractive digital realities—continuously by one or a plurality of creators, without waitng for slow cycles of periodic updates.

TP DEVICES' DIGITAL REALITIES, EVENTS, BROADCASTS, ETC. AND REVENUES: In some examples there are incentives to provide more successful digital realities such as in some examples revenues and earnings, in some examples larger audiences, in some examples ticket sales, in some examples additional registrations, in some examples additional subscriptions, in some examples additional memberships, in some examples sufficient utilization to support continued provision of one or a plurality of digital realities that people want and choose, in some examples the opportunity to develop and advance new features for digital realities, in some examples the opportunity to add new capabilities within digital realities, in some examples the opportunity to explore new or interesting ways to live, in some examples the opportunity to experiment with new state(s) of reality or ways to express reality, in some examples the ability to consider and perhaps redefine the human condition from new perspectives, etc.

Figure 87A:
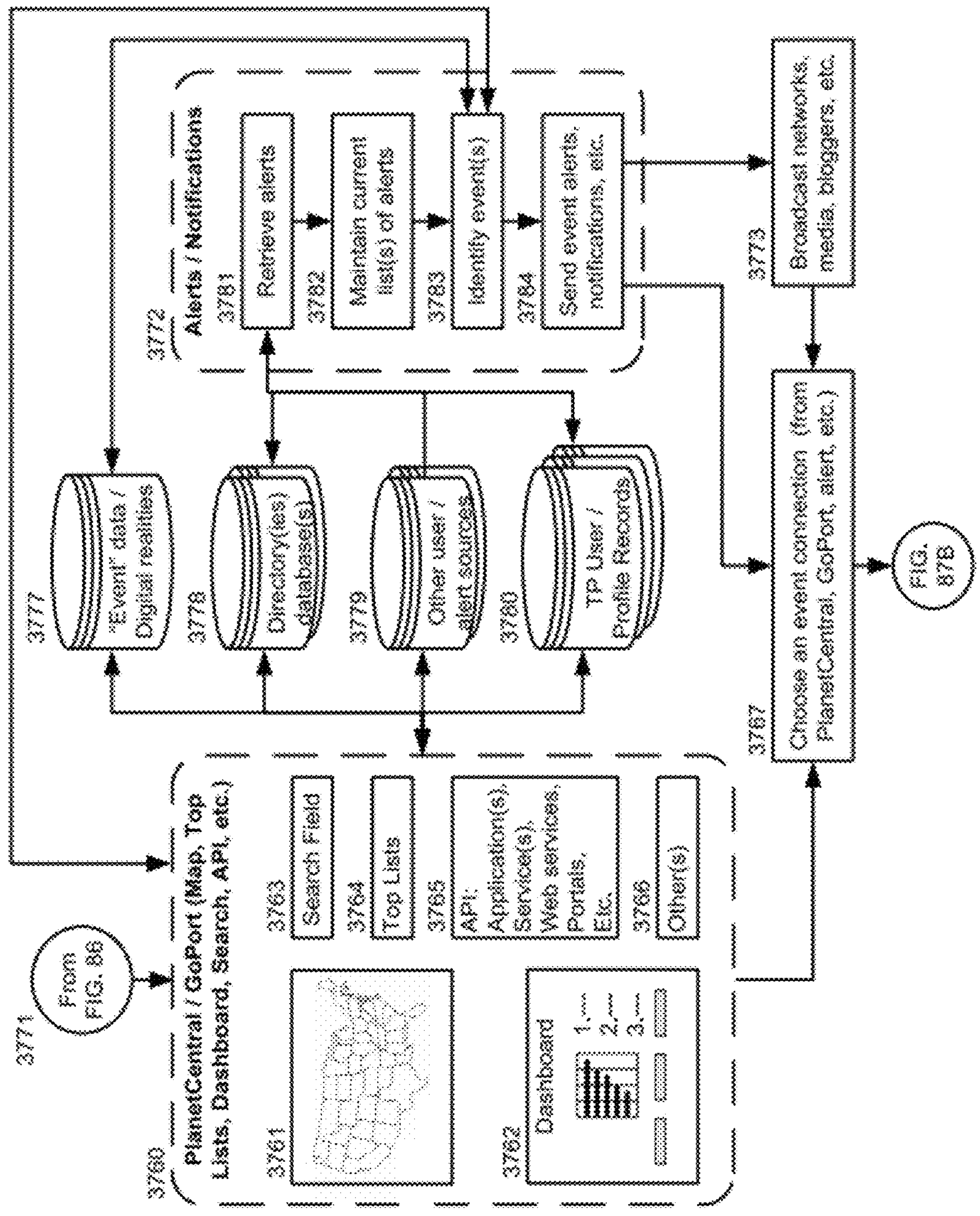
FIG. 87 is a flow chart showing some examples of procedures for finding digital presence events (such as a PlanetCentral or GoPort, search, alerts, top lists, APIs, portals, etc.), attending an event (including free or paid admission systems), and monetizing suddenly popular free events.
Figure 87B:
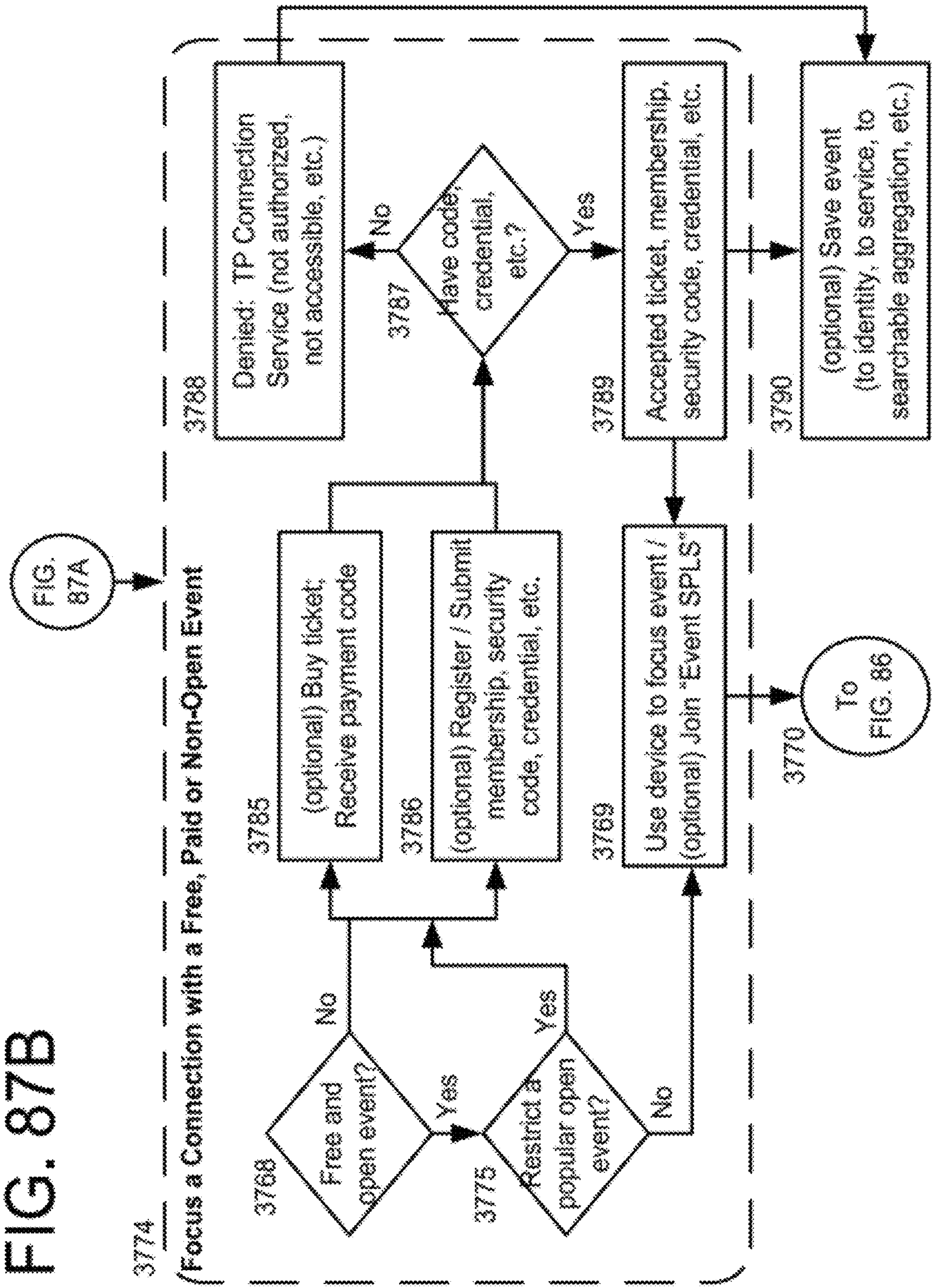

Turning now to FIG. 41, "TP Devices' Digital Realities, Events, Broadcasts, Etc. and Revenues," one or a plurality of requests for a digital reality(ies) is received 2110 from one or a plurality of sources such as described elsewhere (such as in FIG. 87 which describes a current events, places and constructed digital realities media that includes searches, lists, applications, services, portals, dashboards, events, alerts, subscriptions, directories, profiles, and other sources). Said request(s) 2110 is received by a source that provides a requested digital reality, or provides access to a plurality of digital realities; and requestors in some examples may be an LTP(s) 2112, in some examples may be an MTP(s) 2112, in some examples may be an RTP(s) 2112, in some examples may be a TP subsidiary device(s) 2112, in some examples may be an AID(s)/AOD(s) 2112, in some examples may be a TP network device(s) 2113, and in some examples may be another type of networked electronic device(s).

Being permitted to join a focused connection 2121 in response to a request 2110 is described elsewhere in more detail (such as in attending a free, paid or restricted event in FIG. 87 and elsewhere), and said connection is defined herein as an "event," which includes live or recorded streams such as events, places and constructed digital realities. In a brief summary in some examples said request(s) to enable a focused connection 2116 do not require payment 2117 nor have any restriction 2118 so that a focused connection 2121 is opened in response to said request; and (optionally) said requestor may join the SPLS for that connection such as for that event, place, digital reality, group, etc. In some examples said request(s) require acceptance to enable a focused connection 2116 because said "event" is not free 2117 or is restricted 2118 in which case it may require purchase of a ticket 2119, making a payment 2119, paying a fee 2119, registration 2119, subscription 2119, membership 2119, etc. If that is the case, then in some examples a user may submit a code 2122, credential 2122, ticket 2122, membership 2122, authorized identity 2122, subscription code or credential 2122, etc. and if not accepted 2123 or not authorized 2123, said user may be denied the requested connection 2123. In some examples, however, acceptance 2124 or authorization 2124 is granted and a focused connection 2121 is opened in response to said request; and (optionally) said requestor may join the SPLS for that connection such as for that event, place, digital reality, group, etc.

Delivering a stream 2126 2130 in a connection such as 2121 2116 is described elsewhere in more detail. In a brief summary the recipient's identity 2127 is determined along with the recipient's current DIU (Device In Use) 2127, and (optionally) in some examples customize a new stream 2128 for said recipient 2127 or device 2127 such as by (optionally) blending in one or a plurality of advertisements 2129, links to related content 2129, marketing messages 2129, sponsor's content 2129, etc. as described elsewhere. If a stream is customized 2128 2129 sources for said customization 2138 such as sponsor ads, sponsor messages, sponsor links, sponsor marketing, etc. may be retrieved from sponsor services 2144 2145 2149. Whether a standard stream 2121 2126 2130 or a customized stream 2121 2126 2127 2128 2129 2130 is provided, said stream 2130 is logged 2131 along with (optionally) logging data such as audience size 2131, demographics 2131, special features or interactive capabilities used 2131, identities 2131, other relevant usage data 2131, etc. In some examples said logged and stored raw data 2131 2132 2133 may include revenue-related data 2132 such as users' receipt of ads or marketing messages 2132, users' actions that result from advertising or marketing 2132 (ranging from immediate purchases to linking to bookmarking to additions to wish lists to other relevant behaviors), audience member types (if some types of audiences have higher value than others), audience member locations (if audiences in some countries, cities or neighborhoods have higher value than others), date and time used (if some days and times have higher value than others), identity (if some specific individuals have higher value than others), etc. In some examples said logged and stored raw data 2131 may include audience data 2133 such as audience size 2133, audience demographics 2133, various audience behaviors or interactions that are non-revenue producing (e.g., don't involve advertising, marketing, sales, etc.), and other types of audience data that may be tracked for a variety of purposes.

In some examples a connection 2130 includes validating reception 2134 of said stream 2130 to confirm that certain logged data 2131 is as valid as possible. In some examples validation 2134 is by receiving a response from the receiving device 2135 and the appropriate data is logged 2131; in some examples validation 2134 is by receiving a response from the recipient user 2135 and the appropriate data is logged 2131; in some examples of validation 2134 is provided by other means such as by attention tracking, eye tracking, interactions with said stream, etc. (as described in FIG. 119 and elsewhere) and the appropriate data is logged 2131. In some examples if said validation 2134 is unsuccessful 2135, said stream may be managed by an error correction/improvement service 2136 (as described elsewhere; and additionally, may serve as a new trigger for an AKM [Active Knowledge Machine] request as described elsewhere).

In some examples streams 2121 are customized 2128 for one or a plurality of recipients 2127 by blending in sponsor messages, marketing, advertising, video (including audio), images, or other commercial information 2129 that are received from one or a plurality of sponsor services 2138 2145 2149 2144. Said customization 2128 includes determining the one or a plurality of receiving devices 2127 and/or the identity(ies) of one or a plurality of recipients 2127, selecting the appropriate commercial messages for said device(s) and/or recipient(s), blending said stream(s) 2129 as described elsewhere, transmitting said blended stream 2130, and logging the appropriate resulting data 2131 2132 2133 (including in some examples validation of delivery or reception 2134 2135 2131).

Sponsor services provide various systems, processes, methods and other means that generate revenues, one of which may include sponsor services 2145. In some examples said sponsor services 2145 include sponsor selection 2146 such as by sale 2146, auction(s) 2146, etc.; the entry of deliverable messages by the sponsors selected 2147 which may include messages 2147, marketing 2147, advertising 2147, video (including audio) 2147, images 2147, sponsor's content 2147, or other commercial information 2147; and the storage of said messages for retrieval 2148, which may (optionally) include categorized areas such as by types of products or services 2147 2148 (such as for examples automobiles or trucks in transportation 2147 2148, fast food or beverages in food 2147 2148, smart phones or mobile phone services in communications 2147 2148, etc.); in some examples the retrieval of sponsor's video 2149 messages 2149, advertisements 2149, marketing messages 2149, commercial links 2149, etc. such as by categories 2147 as described elsewhere, or (optionally) by individually named competing products 2149 (such as for examples Toyota in automobiles 2149, Nikon in cameras, McDonald's in fast food, AT&T in mobile phone services, etc.); in some examples said sponsors messages retrieved 2149 for blending 2129 and streamed delivery 2130 may be recorded in one or a plurality of systems such as an accounting system 2158, logging system, or other billing and payment system 2158 as described elsewhere.

In some examples said logged revenues data 2131 2132, audience data 2131 2133, and other types of logging that counts and records data about streams, connections, events, digital realities, receptions, audiences, users, identities, broadcasts, etc. may be accessed 2139 2154 2155 such as by sorting 2155, filtering 2155, ranking 2155, extracting 2155, etc. and stored 2156 for a plurality of uses 2160 2161 2162. In some examples said uses include standard or customized dashboards 2160, or standard or customized reports 2160, which utilizes said logged data 2131 2132 2133 2139 2154 2155 2156 for one or a plurality of users such as such as sources 2111 2116 2160, recipients 2110 2121 2126 2160, sponsors 2145 2160 (such as advertisers, marketers, vendors, etc.), device vendors 2160, various types of customers 2160, etc.; and may (optionally) provide data for one or a plurality of services such as a PlanetCentral(s) 2160, a GoPort(s) 2160, an alert(s) 2160, an event(s) 2160, a digital reality(ies) 2160, a report(s) 2160, a dashboard(s) 2160, accounting systems 2158 that utilize ranked data 2156 and raw data 2132 2133, business systems that employ said data 2156, and other external applications that employ said data 2156. In addition, Web and other requests 2161 may provide answers to custom information questions to said users (as described in 2160) and said services (as described in 2160).

In some examples said logged and stored data 2132 2133 2156 is used to provide ranked revenue opportunities 2162 for improved decision-making when constructing digital realities 2162, broadcasts 2162, services 2162, various types of devices 2162, new features when the existing devices are updated and re-launched 2162, and many other types of decisions relating to a growing digital reality (as described elsewhere). In some examples said ranked data 2156 is utilized by a TP digital realities broadcasts, events and revenue(s) generation process, method, system, etc. 2107 as described in FIG. 41 and FIG. 42 and elsewhere. In some examples said ranked data 2156 is utilized to determine revenue producing opportunities for devices such as Teleportals, in some examples said ranked data 2156 is utilized to determine audience generation opportunities, and in some examples said ranked data 2156 is utilized to determine other growth opportunities. As a result, one or a plurality of said digital realities, said broadcasts, said events (or types of events), said services, said devices, etc. may evolve as an ecosystem environment where evidence of visible results produces indicators that lead to greater growth and faster advances in the directions that produce the highest levels of interest 2162, adoption 2162, use 2162, revenues 2162, audiences 2162, and other logged metrics that indicate success 2162.

In some examples accounting systems 2158 (such as described in more detail elsewhere, but described here in a brief summary, as well as having some examples of specific features called) collect revenues 2158 by accessing logged data 2156 2132 2133 that may be used for accounting and billing to invoice sponsors 2150 and receive their payments 2152. In some examples sponsors are invoiced for advertisements 2150; in some examples sponsors are invoiced for marketing messages 2150; in some examples sponsors are invoiced for product placements that are digitally blended into streams 2150; in some examples sponsors are invoiced for brand placements that are digitally blended into streams 2150; in some examples sponsors are invoiced for marketing information delivered within streams 2150; in some examples sponsors are invoiced for links displayed (such as to make an online purchase, see an item in an online store, add an item to a wish list, or any other e-commerce action) 2150; in some examples sponsors are invoiced for any e-commerce link(s) used 2150; etc. In some examples said accounting system(s) provides said accounting data to third parties' billing systems 2158 to invoice sponsors 2150 and receive payment 2152; in some examples said accounting data is utilized for direct invoicing of sponsors 2158 2150 and receiving payment 2152; in some examples one or a plurality of said sponsors

2146 2147 maintain a financial account that includes deposited monies, and said invoices 2158 2150 automatically bill said sponsor's depository account and receive payment 2152 in one electronic step 2150 2152; in some examples one or a plurality of said sponsors 2146 2147 maintain an electronic payment instrument in their financial account (such as in some examples a credit card, in some examples automated payments by a bank account, in some examples automated payments by a third-party payment service, etc.) and said invoices 2158 2150 automatically invoice said sponsor's financial account and receive payment 2152 in one electronic step 2150 2152 by means of said electronic payment instrument; in some examples one or a plurality of said sponsors 2146 2147 receives said invoice(s) 2150 and makes a separate payment(s) 2152.

In some examples accounting systems 2158 pay sources 2164 2165 2111 2112 2113, owners of TP devices who provide sources 2164 2165 2111 2112 2113, etc. (herein collectively referred to as "sources") when monies are invoiced 2150 and received 2152 from sponsors 2145. In some examples one or a plurality of sources are paid for any means by which they monetize their audience(s) 2110 2116 and deliver streams to them 2121 2126. In some examples one or a plurality of sources are paid for delivering advertisements 2129 2150; in some examples sources are paid for marketing messages 2129 2150; in some examples sources are paid for product placements that are digitally blended into streams 2129 2150; in some examples sources are paid for brand placements that are digitally blended into streams 2129 2150; in some examples sources are paid for marketing information delivered within streams 2129 2150; in some examples sources are paid for links displayed (such as to make an online purchase, see an item in an online store, add an item to a wish list, or any other e-commerce action) 2129 2150; in some examples sources are paid for any e-commerce link(s) used 2129 2150; etc. In some examples one or a plurality of sources are paid due to a recipient's buying a ticket 2119 2120 to access said source; in some examples sources are paid due to a recipient's making a payment 2119 2120 to access said source; in some examples sources are paid due to a recipient's paying a fee 2119 2120 to access said source; in some examples sources are paid due to a recipient's registering 2119 2120 to access said source; in some examples sources are paid due to a recipient's subscribing 2119 2120 to access said source; in some examples sources are paid due to a recipient's joining or becoming a member 2119 2120 to access said source; etc. In some examples said payments to one or a plurality of sources 2165 are made from the direct invoicing of sponsors 2158 2150 and receiving their payment (s) 2152; in some examples said payments to one or a plurality of sources 2165 are received from third parties' billing and payment systems 2158 wherein said third parties invoice one or a plurality of sponsors 2150, receive one or a plurality of sponsors' payment(s) 2152, and pay said sources 2165.

In some examples sources 2166 (which include TP device owners, companies, broadcasters, and other types of sources) utilize data to determine their best opportunities to increase revenues 2166 2167, audiences 2166 2167 or other success indicators and metrics 2166 2167. In some examples sources utilize logged data 2131 2132 2133 2155 2156; in some examples sources utilize accounting data 2158; in some examples sources utilize ranked growth opportunities 2162; in some examples sources utilize ranked revenue opportunities 2162; in some examples sources utilize ranked audience increase opportunities 2162. In some examples sources utilize one or a plurality of types of market information sources such as in some examples recipients' groups and associations, in some examples market research services, in some examples prepackaged market studies, in some examples device vendor associations, in some examples industry groups, etc. In some examples sources may (optionally) receive aggregate data or subsets of data from one or a plurality of services such as a PlanetCentral(s) 2160, in some examples a GoPort(s) 2160, in some examples an alert(s) service(s) 2160, in some examples a digital event(s) service (s) 2160, in some examples a digital reality(ies) search engine 2160, in some examples an online analytics and reporting service 2160, in some examples an online dashboard(s) service(s) 2160, in some examples a behavior tracking and ad serving service 2160, in some examples an accounting system (s) 2160. In some examples sources may (optionally) receive data from one or a plurality of third-party business systems, or in some examples another external application(s) that logs and/or utilizes said types of data.

In some examples said data is used to determine which types of digital realities to create 2167; in some examples said data is used to determine new trends of emerging types of digital realities 2167; in some examples said data is used to determine digital realities with higher revenues and earnings 2167; in some examples said data is used to determine how to increase audience size 2167; in some examples said data is used to determine how to increase ticket sales 2167; in some examples said data is used to determine how to increase registrations 2167; in some examples said data is used to determine how to increase subscriptions 2167; in some examples said data is used to determine how to increase memberships 2167; in some examples said data is used to determine which of a set of provided digital realities are most preferred and used by their audiences 2167; in some examples said data is used to determine how to develop and obtain feedback on new features for digital realities 2167; in some examples said data is used to determine how to develop and obtain feedback on new capabilities within digital realities 2167; in some examples said data is used to determine which opportunities should be explored to find new or more interesting ways to live digitally 2167; in some examples said data is used to determine new ways to experiment with various interactive options for digital reality 2167; in some examples said data is used to determine the ability to consider the human condition from new perspectives 2167; etc.

Integration with ARM Boundaries Settings (Choose Your "Reality[ies]"): The Alternate Realities Machine (herein ARM) is described elsewhere in detail, but in some examples it provides ARM Boundary Management that provides recipients with greater control over their digital and physical space within the larger shared physical reality—in some examples an ARM provides means to reverse parts of the control over the common shared reality from top-down to bottom-up. As illustrated in some examples (such as in FIG. 115) an ARM includes filters/priorities so that recipients can determine what each wants to include and exclude; in some examples it includes digital and physical self-chosen personal protections for individuals, households, groups, and the public; in some examples it includes Paywalls so that individuals may earn money from providing their attention, rather than giving it away for free to those who sell it to advertisers. The result is personally controlled Shared Planetary Living Spaces (herein SPLS's) that have some parallels to how DVR's (Digital Video Recorders) are used to control hundreds of television channels—we record the television shows we want to see, play and watch what we prefer, and skip what we don't want.

Therefore, in various examples one or a plurality of SPLS boundaries are made explicit and manageable by said ARM. Within a particular set of Boundary Settings one's digital reality may be considerably different than someone else's. In addition, the ARM includes means to save, distribute and try out new Boundaries Settings so the most desirable alternate realities may rapidly spread and be tried, personally altered and adopted wherever they are preferred. As a result, the best alternate realities may be tried and applied with this scope and Seattle that the best realities deserve—possibly providing multiple better competitors than the common shared reality. In some examples the "best" Boundary Settings may be designed, marketed, sold and/or supported by individuals, corporations, governances, interest groups, organizations, etc. to improve the lives and experiences of those who live in their Shared Planetary Living Spaces.

Finally, in some examples a person has multiple identities (as described elsewhere in more detail) and each identity may have its own one or a plurality of SPLS's (as described elsewhere in more detail), and each SPLS may have one or a plurality of ARM Boundary Settings. In other words, in some examples by switching to a different established identity (as described elsewhere), a person immediately changes their SPLS(s) and ARM boundaries the new "reality" and is thereby able to experience and enjoy life differently. If a person has a plurality of identities, they may change their ARM boundaries to fit their SPLS's and ARM boundaries in each different identity. As a result, one person may change how reality is presented to them (and therefore perceived by them) as often as they want. The implication is that for one or a plurality of persons, reality can be put under their personal control—rather than the other way around.

Turning now to FIG. 43, "Integration with ARM Boundaries Settings (Choose Your 'Reality[ies]')," illustrates some examples of the above ARM processes which begin in some examples with RTP digital realities 2171 as described elsewhere; in some examples with digital sources 2171 as described elsewhere; in some examples with a broadcasted stream 2171 as described elsewhere; in some examples with governances 2171 as described elsewhere; etc. In some examples this also begins with a person's ARM boundaries settings 2172; and in some examples this begins with an identity's ARM boundaries settings 2172 (in which case an individual has one or a plurality of identities); and said person or identity has one or a plurality of ARM boundary settings.

In some examples after experiencing a source such as a digital reality 2171, a broadcasted stream 2171, a component of a governance 2171, or another type of source 2171, said identity 2172 may optionally choose to modify an ARM boundary for that source 2175. In some examples ARM boundaries (as described elsewhere in more detail) include priorities/exclusions 2175, a Paywall 2175, protection 2175, etc. In a brief summary a subset of said ARM boundaries are illustrated, namely the optional ARM boundary setting for prioritizing 2176 or excluding 2176 the source 2171 that was experienced. In a similar manner, the experience of any source 2171 may be utilized to modify any appropriate ARM boundary setting 2175 for a person 2172 or for one of said person's identities 2172.

In some examples the modification of said ARM boundary 2176 begins by deciding whether or not to apply a known ARM boundary 2177 that is based on said source 2171; in some examples a source 2171 is tried because it is new and popular so there may be an associated ARM boundary setting to rapidly include and prioritize said popular new source 2171; in some examples a source 2171 is tried because it may seem interesting but some of those who tried it may have disliked it so there may be one or a plurality of associated ARM boundary settings to exclude said source 2171, or to provide partial blocking of that source 2171. In some examples a source 2171 may belong to a category such as rock music stars, urban crimes in progress, new technology product launches, or any other category that a person may want to raise or diminish in importance. In some examples where there is an existing priority boundary and/or exclusion boundary for a category 2178 (rather than a specific source) it can be selected 2178 and adapted 2178 by increasing or decreasing that category's priority as described elsewhere. Said existing priority boundary(ies) 2178 and/or exclusion boundary(ies) 2178 is retrieved from one or a plurality of existing priority/filters databases 2179, displayed for selection 2178, and either used 2177 or not used 2177; then, if selected and used it may be adapted to fit the user's preferences 2178.

In some examples an existing boundary 2177 is not used and an ARM boundary setting may be created and set 2180 2182 2184 2186. In some examples said source 2171 may be added to priorities 2180 by adding it at a top priority 2181 or setting its priority level 2181 2188; in some examples said source 2171 may be added as an exclusion 2182 by adding it as completely blocked 2183 or setting its priority level 2183 2188. In some examples said source 2171 is already part of an ARM boundary so that it may have been part of that identitys experience because that ARM boundary did not block it, made it a slight priority, or included it as a top priority; so in some examples a user would want to modify the ARM boundary that affects said source 2171—if the experience was superior then the priority level of said source 2171 would be increased 2185 2188; and if the experience was poor then the priority level of said source 2171 would be decreased 2185 2188; and if the experience was negative or any reason then the ARM boundary would be set for varying levels of exclusion 2186 2187, right up to a complete block 2188. In some examples varying scales 2188 2189 may be used to set ARM boundaries such as priority boundary(ies) 2180 2184 and/or exclusion boundary(ies) 2182 2186, such as the seven-point scale used herein (though numerous types of scales are known, and may be employed appropriately). In some examples a seven-point scale for priorities 2180 2184 through exclusions 2182 2186 includes almost half that scale employed for priorities such as "top priority" 2189, "strongly preferred" 2189 and "somewhat preferred" 2189. In some examples a clear non-preferential midpoint maybe may be included such as "neutral" 2189 which neither prioritizes nor excludes said source 2171. In some examples said seven-point scale 2188 2189 includes almost half that scale employed to filter exclusions such as "somewhat blocked" 2189, "usually blocked" 2189 and "completely blocked" 2189.

In some examples after adding a priority boundary 2180 2181, adding an exclusionary filter 2182 2183, or modifying an existing priority/exclusion 2184 2185 2186 2187 by selecting the preferred level for a source 2171 from the boundary's scale 2188 2189, that boundary may be saved to a priority/filters database 2179. That boundary and said user's preference then becomes available for rapid display and selection 2178, where it may either be used 2177 or not used 2177; then, if selected and used by another person or identity it may be adapted to fit another user's preferred level of prioritization/exclusion 2178 for that source 2171.

In some examples In some examples after adding a priority boundary 2180 2181, adding an exclusionary filter 2182 2183, or modifying an existing priority/exclusion 2184 2185 2186 2187 by selecting the preferred boundary level for a source 2171 from the boundary's scale 2188 2189, that boundary may be saved to a user's profile 2190 where it may be retrieved and used by an identity 2172. In some examples said ARM boundary for priorities/exclusions 2176 is not altered so in that case another ARM boundary may (optionally) be modified 2194. In some examples after completing the modification of said ARM boundary 2176 and saving said updated ARM boundary 2190, a person 2172 or identity 2172 may (optionally) choose to modify another ARM boundary based on the experience of that source 2194. In some examples other ARM boundaries that may be set (as described elsewhere in more detail) include a Paywall 2194, protection 2194, etc.

In some examples after desired ARM boundary modifications are complete 2175 2176 2194 said ARM boundaries settings process(es) ends 2195, and said updated ARM boundaries are applied 2195.

SUPERIOR VIEWER SENSOR: Typical current displays on televisions, computers, digital picture frames, electronic pads, tablets, cell phones, etc. are "unreal" in that their displayed images are fixed and do not have the changing field of view that is easily seen by looking through any window and moving from side to side or stepping forward and back, nor do they have parallax shifts when the screen's user changes position and obtains a new perspective (e.g., a new line of sight).

In some examples a subsystem that may be optionally added to varied devices is a Superior Viewer Sensor (herein SVS) which automatically and/or manually updates and controls a visual display(s) based on the position of one or a plurality of viewers relative to said display, in order to simulate the changing real view that is seen through a real window. In some examples this provides TPDP (Teleportal Digital Presence) with an automated simulation of views through a real window so that as one or a plurality of viewers move relative to the device's screen the image displayed is adjusted to match the position(s) of the viewer(s). Because an SVS is digital it may also provide other digital features and functions.

As a result of an SVS subsystem, a viewer becomes a "superior viewer" because the viewer's "normal" digital presence may be seen, heard, experienced, manipulated, used and understood in more detail and in more ways than the physically present local world is generally experienced—making digital presence in some examples a richer, wider, more varied, simultaneously multiplied (with more views and/or locations at once), interesting and controlled experience than one's local physical presence. Therefore, in some examples an SVS subsystem produces a simulation of the view through a window by means of a display screen, as well as digitally enhanced views and sounds of what is displayed by means of digital video processing and/or digital audio processing. In some examples an SVS subsystem is comprised of a device such as devices illustrated in FIG. 44 and described elsewhere; real-time video processed by said device and/or stored video or images; a display screen that displays said video and/or images; a sensor that detects and locates one or a plurality of observers with respect to said display screen; a display control system, method or process that automatically adjusts the image displayed based upon the location of one or a plurality of observers with respect to the display screen; and optional digital visual enhancements and digital audio enhancements where said display control system, method or process adjust the image(s) and/or sounds based upon a command(s) provided by one or a plurality of observers.

In some examples an SVS subsystem may be provided entirely within a single local device; in some examples parts of an SVS subsystem may be distributed such that various functions are located in local and remote devices, storage, and media so that various tasks and/or program storage, data storage, processing, memory, etc. are performed by separate devices and linked through a communication network(s). In some examples one or a plurality of an SVS subsystem's functions may be provided by means other than a device subsystem; in some examples one or a plurality of an SVS subsystem's functions may be provided by a network service; in some examples one or a plurality of an SVS subsystem's functions may be provided by a utility; in some examples one or a plurality of an SVS subsystem's functions may be provided by a network application; in some examples one or a plurality of an SVS subsystem's functions may be provided by a third-party vendor; and in some examples one or a plurality of an SVS subsystem's functions may be provided by other means. In some examples the equivalent of an SVS subsystem may be provided by means other than a device subsystem; in some examples the equivalent of an SVS subsystem may be a network service; in some examples the equivalent of an SVS subsystem may be provided by a utility; in some examples the equivalent of an SVS subsystem may be a remote application; in some examples the equivalent of an SVS subsystem may be provided by a third-party vendor; and in some examples the equivalent of an SVS subsystem may be provided by other means.

Figure 44:
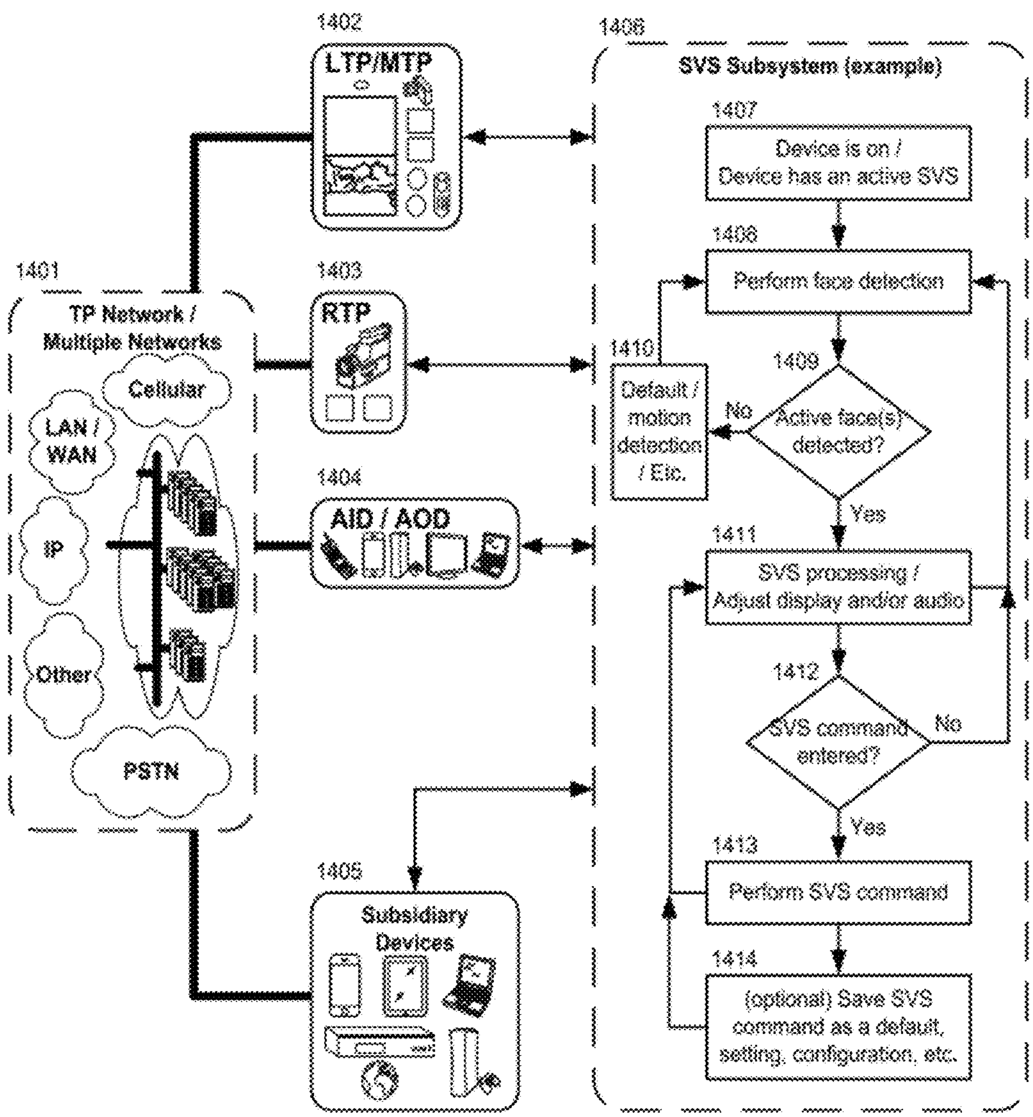
FIG. 44 is a pictorial block diagram showing some examples of the operation of a Superior Viewer Sensor (SVS).

Together, FIG. 44 through FIG. 48 illustrate some examples of an SVS subsystem(s). FIG. 44, "SVS (Superior Viewer Sensor) Devices": In some examples a device's display is controlled by means that include face recognition to determine one or a plurality of viewers' position(s) relative to the screen and adjusting the view display based on the viewer's position to reflect a naturally changing field of view. In some examples additional processing may be performed under the command of one or a plurality of users such as zooming in or out; freezing an image; displaying a fixed viewpoint; utilizing face recognition or object recognition; retrieving data about a viewed or recognized identity or object; boosting faint audio for clarity; cleaning up noisy audio; adding various types of effects, edits, substitutions, etc. to any of the IPTR displayed; or providing any other digital processing or manipulation. In some examples these additional types of digital commands and processing may be saved as a default, setting, configuration, etc. so that device may subsequently provide continuous digital reality(ies) that include a viewer's preferred digital alterations or enhancements.

Figure 45:
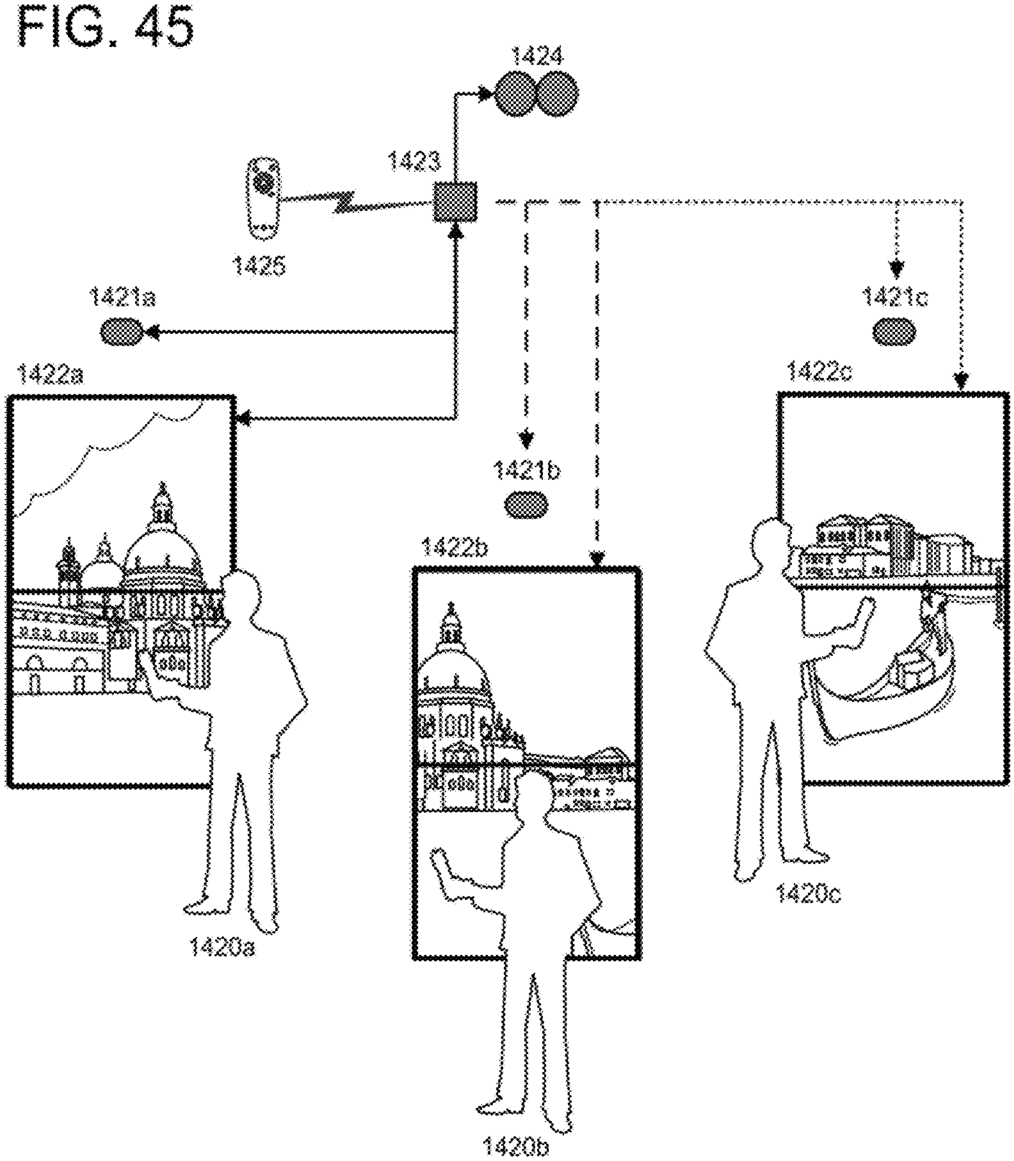
FIG. 45 is a pictorial block diagram that illustrates some examples of the dynamic viewing provided by a Superior Viewer Sensor (SVS).

FIG. 45, "LTP Views with an SVS (example)": In some examples an SVS provides a changing field of view for a viewer as illustrated by a view from an RTP on the Grand Canal in Venice, Italy, during sunset. When the same viewer stands on the right side of an LTP, the center of an LTP, and then the left side of an LTP, the view displayed is changed appropriately. In some examples a viewer may employ SVS commands (such as by a handheld remote control) in order to zoom in to see details along the Grand Canal. In some examples a viewer may converse with a local person by means of an RTP (such as a gondolier in Venice, with language translation provided by a different subsystem). In some examples automatic audio enhancement determines if each participant's voice is below sufficient audio quality and may isolate and boost that person's speech to sufficient clarity and volume; and in some examples said audio speech enhancement may be invoked manually.

Figure 46:
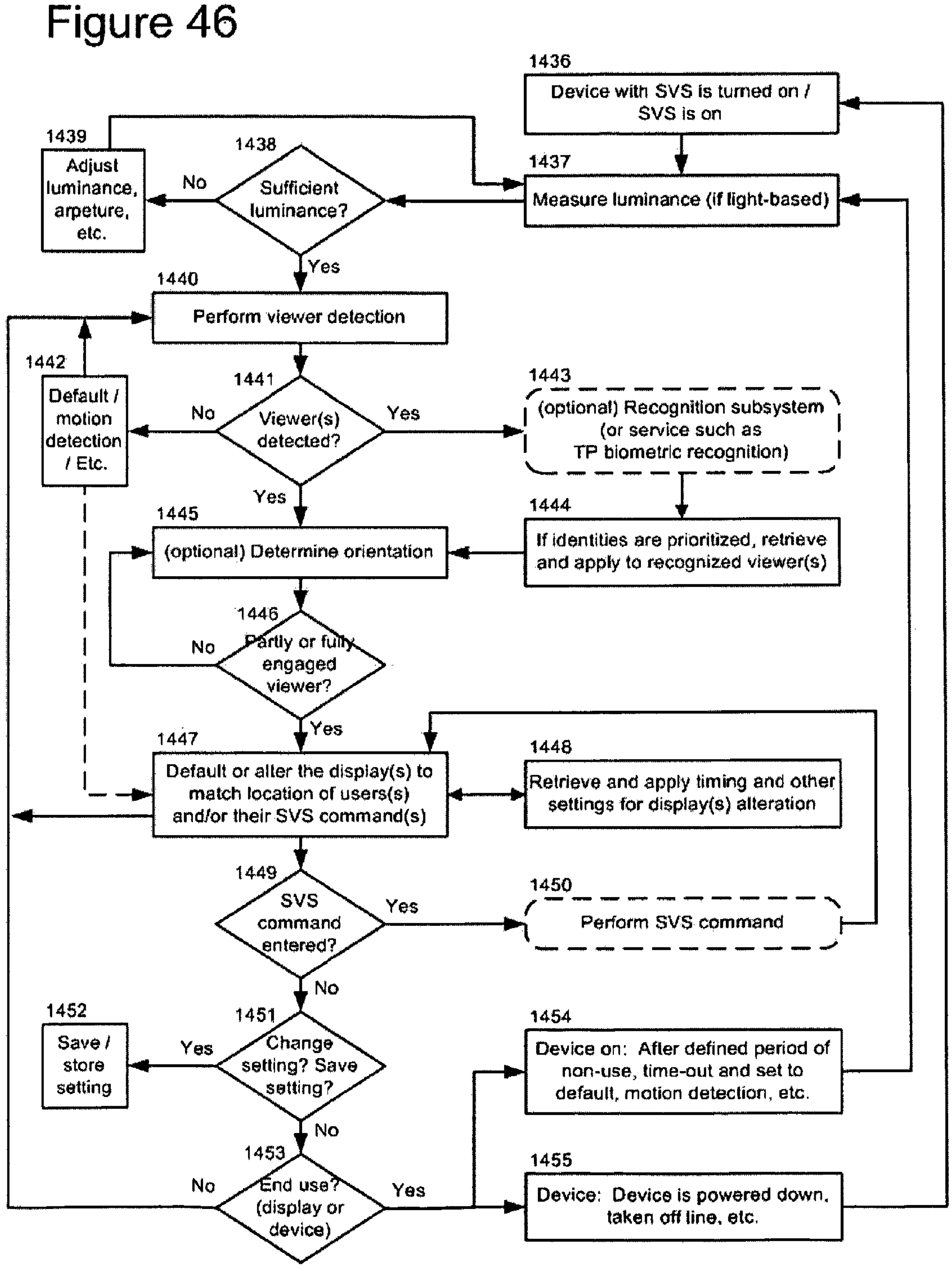
FIG. 46 is a flow chart showing some examples of procedures for providing dynamic SVS viewing.

FIG. 46, "SVS Process": In some examples an SVS includes one or a plurality of viewer sensors, a viewer detecting section, and an optional viewer processing section. In some examples an SVS may adjust luminance, in some examples an SVS provides viewer detection to detect the presence and/or optional orientation of one or a plurality of viewers. In some examples optional viewer recognition is performed for various purposes such as prioritizing how the field of view is changed to reflect the viewing position(s) of one or a plurality of identified and prioritized viewers. In some examples an SVS automatically detects when device use begins (as described herein and elsewhere) and automatically initiates device operation(s) such as in some examples to provide continuous digital reality. In some examples an SVS command is entered and performed on one or a plurality of views, and in some examples an SVS command(s) is saved for automatic application in the future. In some examples an SVS automatically determines when non-use occurs (as described herein and elsewhere) and automatically puts the device into a powered down or waiting state until use begins.

Figure 47:
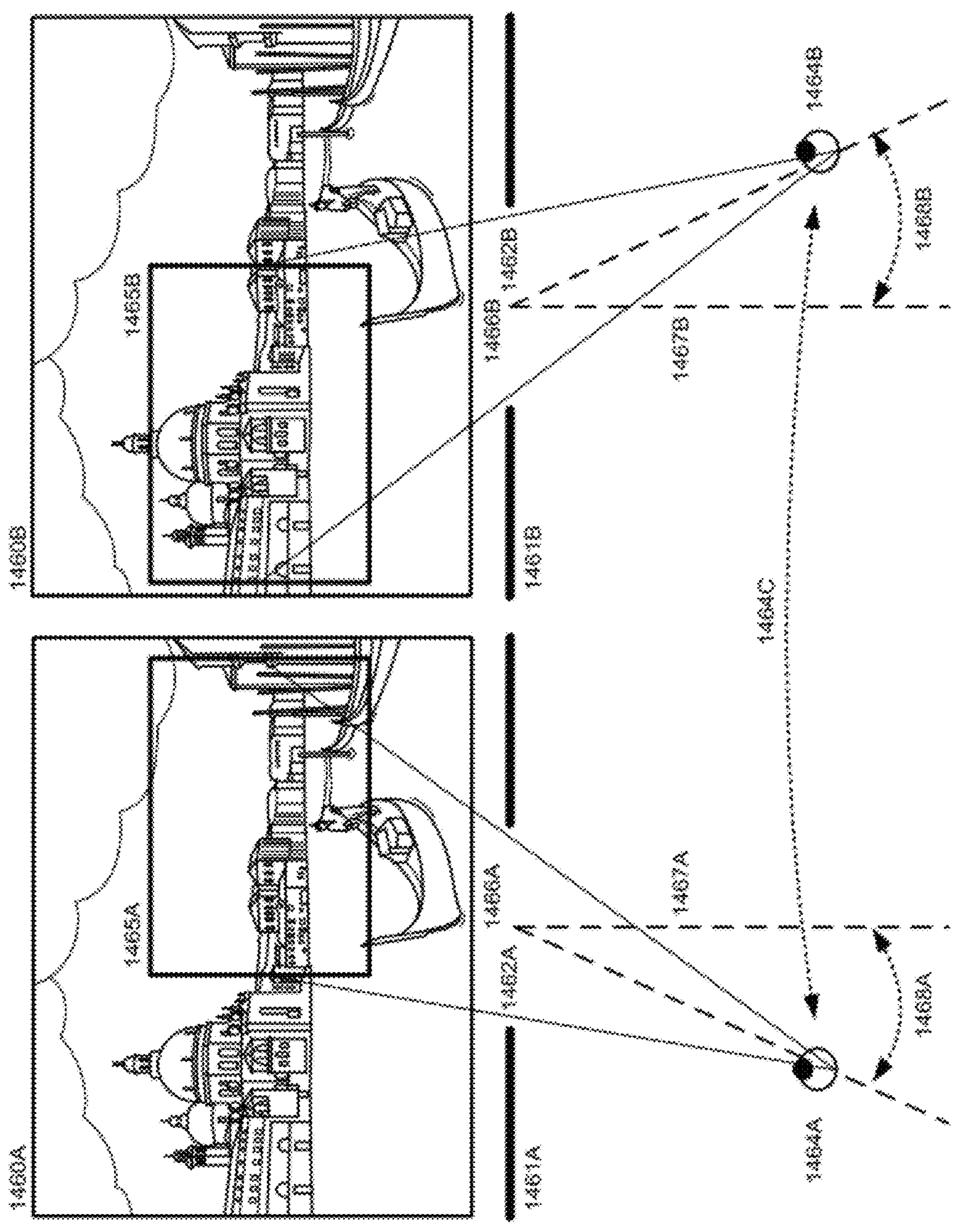
FIG. 47 is a diagram illustrating some examples of changing an SVS view in consequence with the amount of horizontal movement by a viewer relative to a display.
Figure 48:
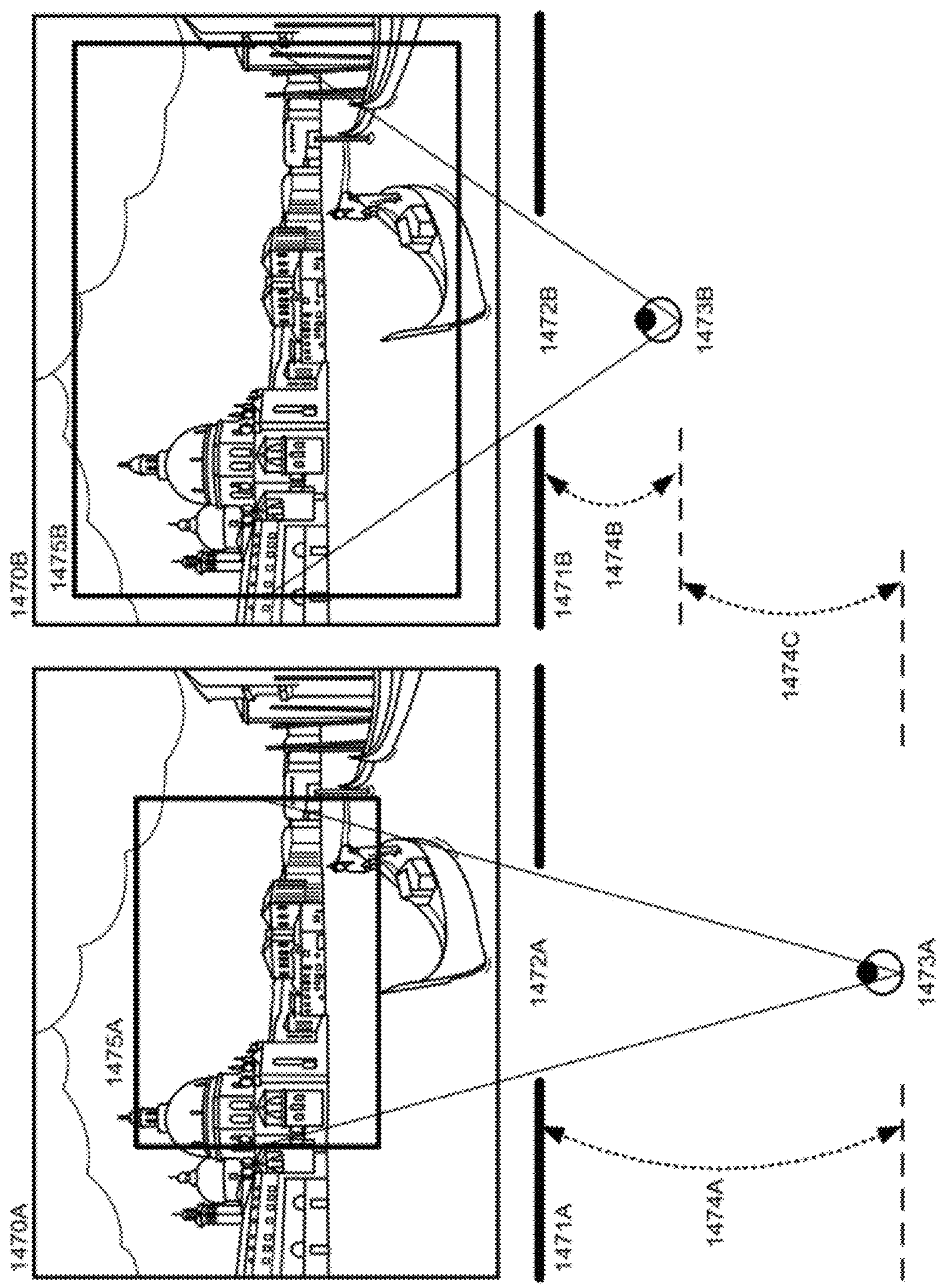
FIG. 48 is a diagram illustrating some examples of changing an SVS view in consequence with changes in a viewer's distance from a display.

FIG. 47, "SVS Changing Field of View due to Viewer Horizontal Location(s)," and FIG. 48, "SVS Changing Field of View due to Viewer Distance from Screen": In some examples one or a plurality of SVS(s) calculates the image(s) displayed by determining the horizontal and distance location (s) of one or a plurality of viewers in relation to the center of a display screen (or in some larger displays in relation to the center of a plurality of screens). In some examples the received image is larger than the viewing area of the display screen so that as a viewer moves a responsively adjusted region of the received image may be displayed in the appropriate region (such as a "window") of a device's screen.

Superior viewer sensor devices: Turning now to FIG. 44 "SVS (Superior Viewer Sensor) Devices," in some examples an LTP (Local Teleportal) 1402 may include an SVS subsystem; in some examples an MTP (Mobile Teleportal) 1402 may include an SVS subsystem; in some examples an RTP (Remote Teleportal) 1403 may include an SVS subsystem; in some examples an AID/AOD (Alternate Input Device/Alternate Output Device) 1404 as described elsewhere may include an SVS subsystem; in some examples a Subsidiary Device 1405 as described elsewhere may include an SVS subsystem; and in some examples other types of devices may include an SVS subsystem. In some examples said devices 1402 1403 1404 1405 are connected by one or a plurality of disparate networks 1401; in some examples parts of an SVS subsystem may be distributed such that various functions are located in local and remote devices, storage, and media so that various tasks and/or program storage, data storage, processing, memory, etc. are performed by separate devices and linked through said network(s) 1401; in some examples the equivalent of an SVS subsystem may be provided by means other than a device's local subsystem and provided over said network(s) 1401.

In some examples said SVS subsystem has a process 1406 that in some examples starts when said device is on 1407 and when said device has an SVS 1407 that is active; in some examples face detection is performed 1408 by said SVS; in some examples if one or a plurality of detected faces is turned torward the display screen then an active face(s) has been detected 1409; in some examples SVS processing determines the location of one or a plurality of viewers with respect to the display screen 1411 and the appropriate displayed video(s) and/or image(s) are adjusted 1411 based on the distance or angle of the viewer(s) to simulate the view through a window 1411; in some examples no active face(s) is detected 1409 and in some examples the SVS subsystem then goes into its default waiting state 1410, in some examples the SVS subsystem's default is to detect movement on the part of a viewer (s) 1410, and in some examples the SVS subsystem may include a motion detector 1410, and in any of these cases the SVS subsystem performs face detection again 1408; in some examples one or a plurality of viewers may enter an SVS command 1412 in which case the SVS processing performs said SVS command(s) 1413 and performs the appropriate video or audio adjustment 1413 for said command, and/or performs a different and appropriate action 1413 for said command.

Because an SVS is digital said commands 1412 may provide enhanced digital features and functions such as in some examples zooming in to see details 1412; in some examples zooming out to see the big picture(s) 1412; in some examples freezing an image to analyze it 1412; in some examples displaying a fixed viewpoint like an ordinary computer screen view without dynamic SVS adjustment based on the viewer (s) position 1412 (as described elsewhere); in some examples utilizing recognition to identify an individual or an object and/or retrieve data about said individual or object 1412; in some examples enhancing audio for clarity 1412 (such as in some examples raising the volume of voices so fainter voices may be understood, in some examples increasing clarity by filtering noisy backgrounds, and in some examples providing other audio enhancements); in some examples recording and storing video, audio, still images, etc. for retrieval and use in the future 1412; in some examples changing the view or viewpoint (if a plurality of views are available) 1412; in some examples adding various types of effects, edits, substitutions, etc. to any of the IPTR displayed 1412; in some examples substituting an edited display as the source output with or without informing other participants of said edited alterations 1412; or performing any other digital manipulation 1412. Said digital functions may be performed by means of commands that may include gestures 1412 in some examples, voice 1412 in some examples, a remote control(s) 1412 in some examples, a touch screen 1412 in some examples, on-screen controls 1412 in some examples, a pointing device(s) 1412 in some examples, a 3-D controller 1412 in some examples, a menu 1412 in some examples, etc.; and in some examples providing other types of controls 1412, controllers 1412, features 1412 and functions 1412.

In some examples SVS commands 1412 may be saved as defaults 1414, settings 1414, configurations 1414, or another storage means 1414 so that they may be performed automatically 1411 thereafter, without requiring the direct control of one or a plurality of users 1412. In some examples an SVS may therefore automatically produce a continuous digital reality(ies) 1411 that include the preferred digital alterations 1412 1414 and/or enhancements 1412 1414 desired by one or a plurality of users.

Superior viewer example views: Turning now to FIG. 45, "LTP Views with an SVS (example)," in some examples a viewer 1420*a* stands in front of the right side of an LTP 1422*a* while holding a remote control 1425 which provides one of multiple means to control said LTP 1422*a*, and hears audio from the remote location by means of audio speaker(s) 1424. In some examples that viewer 1420*b* has moved to the center of the LTP 1422*b* while continuing to hold a remote control that controls said LTP 1422*b*. In some examples that viewer 1420*c* has moved to the near left side of an LTP 1422*c* while continuing to hold a remote control that controls said LTP 1422*c*. As illustrated in FIG. 18 said viewer 1420*a* 1420*b* 1420*c* is connected in real-time with an RTP that is located on the Grand Canal in Venice, Italy, and is viewing it during sunset. By utilizing the RTP's wide and tall view of the Grand Canal an SVS subsystem can display varying simulated realistic window views in real-time to viewer 1420*a* 1420*b* 1420*c*.

In a first example said viewer 1420*a* has approached the LTP 1422*a* for a closer view of the Basilica of St. Mary of Health (Basilica di Santa Maria della Salute), a Roman Catholic church whose dome has become a landmark and emblem of Venice. In response to said change in the viewer's location 1420*a* an SVS sensor 1421*a* determines the new location of the viewer 1420*a* with respect to the LTP display screen 1422*a*, calculates 1423 and displays 1423 the appropriate view 1422*a* for said viewer's position 1420*a* to simulate the appropriate view through that "RTP window" in that location on the Grand Canal. In another example said viewer 1420*b* has stepped back from the LTP 1422*b* for a central view up the Grand Canal, and in response to said change in the viewer's location 1420*b* the SVS sensor 1421*b* determines the new location of viewer 1420*b* with respect to the LTP display screen 1422*b*, calculates 1423 and displays 1423 the appropriate view 1422*b* of the Grand Canal for said viewer's new position 1422*b* to simulate the appropriate view through that "RTP window" on the Grand Canal. Optionally, viewer 1420*b* may employ SVS commands by means such as a handheld remote control 1425 that control video processing 1423 and/or audio processing 1423 such as in some examples zooming in to see details, in some examples zooming out to see the big picture of the Grand Canal, in some examples audio zooming to hear specific sounds more clearly, etc.

In another example said viewer 1420*c* has stepped up close to the left side of the LTP 1422*c* for a close up view of a gondolier on Venice's Grand Canal, and in response to said change in the viewer's location 1420*c* the SVS sensor 1421*c* determines the new location of viewer 1420*c* with respect to the LTP display screen 1422*c*, calculates 1423 and displays 1423 the appropriate view 1422*c* of the gondolier and Grand Canal for said viewer's new position 1422*c* to simulate the appropriate view through that "RTP window" on the Grand Canal. Because said gondolier seems close enough, viewer 1420*c* calls "Hello" to gondolier and because the local RTP on the Grand Canal is full-featured, said viewer's voice is projected from the local RTP's speaker(s). If the gondolier answers "Ciao" in Italian in some examples an automatic translation subsystem contextually identifies participants in the United States and Italy, that the US participant spoke the English word "hello" and the Italian participant responded in that language, and provides automatic real-time language translation as described elsewhere. In some examples US viewer 1420*c* may need to use a command or the handheld remote control 1425 to start a translation subsystem, service, application, etc. If a conversation ensues between said US viewer 1420*c* and said gondolier, in some examples automatic audio enhancement contextually identifies the appropriate remote participant(s) which in this case is a gondolier, and determines if said gondolier's voice is below sufficient audio legibility, and if so isolates and boosts said gondolier's voice audio to increase its clarity and volume by means such as noise cancellation, equalization, dynamic volume adjustment, etc. In some examples US viewer 1420*c* may need to use a command or the handheld remote control 1425 to start audio enhancement processing application, subsystem, service, etc. As a result in some examples a US viewer 1420*c* may talk directly to a passing gondolier on Venice's Grand Canal.

SUPERIOR VIEWER PROCESS: In some examples a device or a device SVS includes one or a plurality of viewer sensors, a viewer detecting section, an optional viewer processing section and other device components as described elsewhere, such as in some examples display output processing 1252 in FIG. 31. In some examples one or a plurality of sensors may be employed individually or in combination to provide viewer detection and viewer location with respect to a device's display screen which in some examples is imaging such as by means of a camera(s), in some examples is ultrasonic, in some examples is infrared, in some examples is radar, in some examples is a plurality of audio microphones, in some examples is a plurality of pressure sensors such as in a floor, and in some examples is other detection means. In some examples each type of sensor provides its own type of data such as image data from a camera, so each corresponding processing by a viewer detecting section analyzes the data provided by each type of sensor. In some examples as image data is provided by an image sensor a face detecting section detects an object's face area, face size, face orientation, skin color, or other cues depending upon that type of sensor. Similarly, each type of sensor provides its corresponding data types such as the use of audio cues when the sensor(s) includes a plurality of microphones that determine presence and position by means of audio sounds and levels.

In some examples one object of a device's sensor is to detect certain characterizing components of objects such as the face of a person relative to a device's screen, herein generally referred to as viewer detection. In some examples said viewer detection includes detecting one or a plurality of objects, then detecting a section of said object that characterizes a portion of said object, then detecting a human face as the characterizing portion. In some examples a number of known technologies may be employed such as in some examples technologies used in digital cameras to determine the presence of faces in a picture taking region, determine the distance to the detected faces, and employ that data to set the camera's focus so that one or a plurality of faces is automatically rendered clearly and in focus when a picture is taken. In addition, other known facial analysis technologies provide various types of face data analysis such as technologies used in digital cameras that determine when a face in a picture has blinked and then display a "blink error" or "blink warning" to the picture taker so the picture can be checked and retaken if needed. In some examples other face detection technologies are known for detecting one or a plurality of viewers with respect to a display screen such as the identification and use of skin colors, identification of candidate face region areas with hierarchical verification levels, etc.

In some examples the term viewer detecting section refers to software that is run by a device's processor(s), but with alternative types of sensors and sensor data this viewer detection may be implemented by different detection software, or alternatively by a hardware circuit or system. In some examples the viewer detection software is stored in a device's local and/or remote storage, said software is run, and the resulting processed viewer detection data such as viewer information, face size, face position, face orientation, etc. is stored in said device's memory. In some examples said device uses this processed viewer detection data in memory to adjust the device's display screen appropriately for the location(s) of one or a plurality of viewers. Said viewer detection data is retained in memory for repeated use until viewer detection is performed again, at which time newly processed viewer detection data overwrites it and is stored for use until the next viewer detection occurs.

Turning now to FIG. 46, "SVS Process," illustrates some examples in which a device that includes an SVS (as used herein, the term SVS also includes any type of viewer sensor [s]) is turned on 1436 and the SVS is turned on 1436 and active 1436. In some examples the SVS sensor is a camera or other sensor that employs light, in which case an initial step is to measure luminance 1437 to determine if sufficient luminance is present 1438 because if there is insufficient luminance viewer detection that is based on images will produce erroneous results. Luminance may be measured 1437 by using image data from said SVS to determine if it possesses sufficient luminance 1438 to perform viewer detection 1440.

If sufficient luminance is present 1437 1438 then viewer detection 1440 may be performed. If sufficient luminance is not present 1437 1438 the process performs a luminance adjustment step 1439 and then repeats the luminance measurement step 1437 to determine if there is sufficient luminance 1438. Sufficient luminance may be secured 1439 by one or a plurality of means such as in some examples opening a camera arperture 1439, in some examples increasing an image sensor's sensitivity 1439 such as by raising its ISO, or by other known means (such as in some examples means that are employed in video cameras that record acceptable images at extremely low lux levels). In the event luminance adjustment 1439 is performed and the subsequent luminance measurement 1437 indicates sufficient luminance 1438 is not present, then said luminance adjustment step 1439 is repeated with increased values and/or additional luminance sensitivity means until sufficient luminance 1438 is obtained and viewer detection may be performed 1440.

In some examples viewer detection 1440 is image-based and performed by an SVS. Said image-based viewer detection 1440 starts by detecting a moving image, capturing it by means of an image sensor and analyzing the captured image data for face detection information such as skin color, face image(s), face size, face position, etc. At step 1441 it is determined whether one or a plurality of viewers has been detected and if no viewers are detected 1442 then the SVS and display are auto-set for a default 1447 viewer who is located centrally in front of the display and at a reasonable distance from it for that type of device (which may be reasonably estimated from known ergonomic data for certain types of mobile devices and certain types of stationary devices). Alternatively in some examples with a device in a fixed location, if no viewers are detected 1442 the SVS and display may be auto set for a default 1447 that is based upon the entrance to the room in which said device is positioned so that the entrance of a viewer will trigger the SVS and cause its display to respond dynamically as said viewer moves into and through that room. Alternatively in some examples with a mobile or fixed device, if no viewers are detected 1442 the SVS and display may be auto-set for a default 1447 that represents the most common viewer location from which this display has been used in the past (if that device's previous viewer location raw data is stored and analyzed, with the analyzed data stored for future uses such as determining said default display setting). In some examples if no viewers are detected 1442 the SVS may loop in a motion detection process in which it repeatedly and periodically performs motion detection 1440 (such as in some examples periodically capturing two or a plurality of frames of image data and performing a motion detection comparison between them).

In some examples the processing of SVS sensor data determines that one or a plurality of viewers are present 1441 in which case the detected viewer data is stored in memory and used to perform display adjustment 1447. In some examples other viewer engagement data may be stored in memory 1440 such as in some examples participation in a focused connection, in some examples other uses of a device as described elsewhere. Said viewer detection data as well as other viewer engagement data is retained in memory until viewer detection is performed again, at which time newly processed viewer data overwrites it and is retained in memory until the next viewer detection is performed. Storing viewer detection data and viewer engagement data makes it possible to determine the presence of one or a plurality of viewers, along with the optional partial or full engagement of said users with the display. In some examples sufficient or appropriate sensor data 1440 is available in memory so that an optional viewer processing section determines the viewer(s) orientation relative to the display screen 1445. In some examples where a face(s) has been detected 1441 the position, size and/or orientation of said face data 1441 may be used to determine the orientation 1445 of one or a plurality of viewers relative to the display screen 1446 as an indication of each viewer's partial or full attention to said display. In some examples viewer engagement 1446 includes audio sensor data 1440 and in some examples it includes data from other types of sensors. In some examples if one or a plurality of viewers are not engaged 1446 the viewer processing section may loop and repeatedly and periodically perform viewer engagement processing 1445 (such as in some examples periodically capturing a set of frames of image data and performing a face orientation comparison between them). In some examples if one or a plurality of viewers are not engaged 1446 the display may be adjusted to its default 1447 as described elsewhere. In some examples if one or a plurality of viewers are partly engaged 1446 such as in some examples by talking to each other in addition to paying intermittent attention to the display 1446; in some examples by using other handheld devices or mobile devices or stationary devices as well as paying intermittent attention to the display 1446; in some examples by multitasking as well as paying intermittent attention to the display 1446; in some examples by any other simultaneous activity or engagement as well as paying intermittent attention to the display 1446; the optional viewer processing section determines that said partially engaged viewers should be treated as full viewers and included in the adjustment of the display. In some examples if one or a plurality of viewers are engaged 1446 the viewer processing section may periodically reconfirm said engagement by looping and performing viewer engagement processing 1445 (such as in some examples periodically capturing a set of frames of image data and performing a face orientation comparison between them).

In some examples a recognition subsystem 1443 (as described elsewhere) is present and said image adjustment 1447 may utilize said recognition subsystem 1443 to determine one or a plurality of specific viewers, such as the owner or principal user of a device. In some examples recognition subsystem 1443 may be a service such as TP biometric recognition 1443. In some examples one or a plurality of recognizable identities may be prioritized 1444 such as in some examples the owner of the device in use, in some examples family or friends of the owner of the device in use, in some examples a recognizable member of a designated group or category of users of said device such as a company's employees whose cubes or offices are located around a particular conference room where said device is used, in some examples any other designated identity(ies) and/or group(s). In some examples one or a plurality of recognized identities 1443 may be prioritized 1444 so that said display adjustment 1447 may be completely prioritized to reflect the presence 1441 and/or optional orientation(s) 1445 of one or a plurality of said identified 1443 and prioritized 1444 viewers, such as by performing display adjustment 1447 as if only the identified 1443 and prioritized 1444 viewer(s) were present. In some examples one or a plurality of recognized identities 1443 may be prioritized 1444 so that said display adjustment 1447 may be partly prioritized to reflect the presence 1441 and/or optional orientation(s) 1445 of one or a plurality of said identified 1443 and prioritized 1444 viewers, such as by weighting the identified 1443 and prioritized 1444 viewer(s) at the same higher value than a lower weighting for unidentified 1443 and unprioritized 1444 viewer(s). In some examples one or a plurality of recognized identities 1443 may be prioritized 1444 so that said display adjustment 1447 may be differentially prioritized based on the different identities of recognized viewers 1443 to reflect the presence 1441 and/or optional orientation(s) 1445 of one or a plurality of said identified 1443 and differentially prioritized 1444 viewers, such as by providing different weights for each identified 1443 and prioritized 1444 viewer as well as providing a lower weighting for unidentified 1443 and unprioritized 1444 viewer(s).

In some examples viewer detection 1440, optional viewer orientation 1445, and/or optional viewer engagement 1446 determines the one or a plurality of viewers and their position (s) with respect to the display. Since a device's output automatically adjusts 1447 based upon the position of one or a plurality of viewers, including dynamic changes in the position(s) of a viewer(s), the adjustment process is as follows and as described elsewhere. In some examples one viewer is detected 1440 1441 1445 1446 and the position of said viewer is determined with respect to the display, and in some examples the processor determines metrics for said user such as the viewer's angle from the center of the display in some examples, the viewer's distance from the center of the display in some examples, or other alignment metrics in some examples; and said position metrics are used to determine how the display should be adjusted 1447 to serve that viewer; and in some examples processing provides a corresponding positioning for the "window" output 1252 in FIG. 31 that simulates the view that is seen through a real window. In some examples a plurality of viewers is detected 1440 1441 1445 1446 and the positions of said viewers are determined with respect to the display, and in some examples the display is adjusted 1447 based on a median or average viewing position of the collection of viewers that are recognized; that is, the metrics for each user are determined individually, then the set of two or more viewers' positions are determined with respect to the display screen, and the processing provides the average or best corresponding positioning for the window output 1252 that simulates the view seen through a real window.

In some examples after detecting one or a plurality of viewers 1440 1441 1445 1446 and adjusting said output display 1447 there is a change in the position of one or a plurality of viewers; and in some examples after detecting one or a plurality of viewers 1440 1441 1445 1446 and adjusting said output display 1447 there is a change in the number of viewers who are partially or fully engaged 1446 with the display; either individually or in combination various changes serve as a trigger(s) to perform viewer detection 1440 and repeat the appropriate steps that update the viewer data in memory so that processing may determine the corresponding adjustments of the display 1447 that synchronize its displayed "window" with the new location(s) and/or new collection of one or a plurality of recognized viewers. In some examples after detecting one or a plurality of recognized viewers 1440 1441 1445 1446 said viewers are automatically tracked by a SVS so that changes in their position(s), the addition of a new viewer(s), and/or the exiting of a recognized viewer(s) triggers viewer detection 1440 and an appropriate corresponding updating of the displayed "window" 1447. In some examples after detecting one or a plurality of recognized viewers 1440 1441 1445 1446 a subset of said viewers' behaviors, cues, or task indicators are tracked by a SVS so that changes in said tracked cues, behaviors, task indicators, etc. trigger viewer detection 1440 and corresponding updating of the "window" displayed 1447.

In some examples one or a plurality of settings that control the frequency, timing, smoothness, transitions, and other attributes of said display adjustments 1447 may optionally be set and saved 1448. In some examples this provides for different types of devices to employ display adjustments 1447 such as for example when a device has insufficient processing or bandwidth for smooth real-time display adjustments it may utilize settings for periodic adjustments with a specified type of transition such as a jump cut or page turn from one display view to the next display view. In some examples when said attributes are stored 1448, then retrieve and apply said attributes 1448 at the start of said displays 1447 and continue applying said attributes 1448 to subsequent display adjustments 1447 until said attributes are edited and the updated settings are saved and stored 1448.

Because the resulting display 1447 is digital, in some examples a viewer may choose to utilize various SVS commands 1449 that alter the display 1450 1447 in one or a plurality of ways. A range of commands, subsystems, services, applications, tools, resources, etc. may be used to implement those digital capabilities 1450 1447 including any known technology or service. Without limiting these digital capabilities some examples include in some examples zooming in or out 1449 1450 1447; in some examples changing the display's view 1449 1450 1447; in some examples taking a static snapshot of a display 1449 1450 1447; in some examples performing various types of analysis on live video or on a static image or snapshot 1449 1450 1447; in some examples identifying an identity or object in a display 1449 1450 1447; in some examples retrieving information about an identified identity, object, etc. 1449 1450 1447; in some examples enhancing audio so that remote conversations, sounds, etc. are heard clearly 1449 1450 1447; in some examples making visible or surreptitious recordings 1449 1450 1447; in some examples altering and/or editing the display, its participants, location or content in real-time 1449 1450 1447; in some examples substituting an edited display as source output with or without informing other participants 1449 1450 1447; in some examples recording an edited display as if it were a source event with or without adding information that an altered display was recorded 1449 1450 1447; or in some examples performing other real-time digital manipulations. In some examples SVS commands may be entered 1449 1450 by voice and one or a plurality of wired and/or wireless microphones; in some examples SVS commands may be entered 1449 1450 by gestures; in some examples SVS commands may be entered 1449 1450 by a handheld remote control; in some examples SVS commands may be entered 1449 1450 by a touchscreen; in some examples SVS commands may be entered 1449 1450 by visible on-screen controls; in some examples SVS commands may be entered 1449 1450 by pointing devices; in some examples SVS commands may be entered 1449 1450 by many systems; in some examples SVS commands may be entered 1449 1450 by any known type of software or hardware control or controller. In some examples of commands entered 1449 such as in some examples "right" 1450, in some examples "left" 1450, in some examples "down" 1450, in some examples "up" 1450, in some examples "zoom in" 1450, in some examples "zoom out" 1450, in some examples "recognize identity(ies)" 1450, in some examples "retrieve (identity name's) data" 1450, in some examples "make (identity name) invisible" 1450, in some examples "track (identity name)" 1450, in some examples "start (or pause or stop) recording" 1450, or any other available command 1449 1450 device processing provides the appropriate command(s) and/or processing steps to the appropriate display output(s) 1450 or to the appropriate digital processing application(s) 1450 in some examples to move the image(s) displayed the appropriate amount 1450, in some examples to carry out the corresponding digital image processing functions 1450, in some examples to utilize local device and/or remote resources to perform said commands 1450.

In some examples commands entered 1451 may be to set 1451, edit 1451 and/or save 1452 attributes of the SVS subsystem such as in some examples the sensitivity of luminance measurement 1437 and/or luminance adjustment(s) 1438 1439 (if an SVS sensor incorporates light); in some examples settings for viewer detection features 1440; in some examples selecting from a set of default(s) 1442 when viewers are not detected 1441; in some examples motion detection parameters 1442 when viewers are detected 1441 or in some examples when viewers are not detected 1441; in some examples the complete use, weighted use or non-use of a recognition subsystem 1443 1444 if a recognition subsystem is present; in some examples the timing of a display's responses to facial orientation changes 1445 to permit a viewer to have intermittent facial orientation toward other people or tasks before the display is changed; in some examples the timing for adjusting the display 1447 such as in some examples smooth real-time scrolling 1447, in some examples threshold-based jump cuts 1447, in some examples wipes 1447, in some examples scrolling 1447, in some examples other types of transitions between display adjustments 1447; in some examples the various attributes of each display command 1449 1450; in some examples automatic device operation 1453 1454 1455 when use is ending; in some examples any other SVS display or digital command setting (s) that may be saved and retrieved for use in the future. In some examples said saved setting(s) 1451 1452 are retrieved and applied to the operation of each subsystem feature and capability to which each setting applies.

In some examples when the use of a device with an SVS subsystem ends 1453 if the device remains on and is not turned off then after a defined period of non-use 1454 the device is timed out and set to a default such as in some examples a blank display screen 1454, in some examples a standby state 1454, in some examples everything powered down except motion detection and corresponding processing for detected motions 1454 that trigger a device "wake up" process if sufficient motion is detected 1454 with a resulting re-start of the SVS process 1437. In some examples of ending use 1453 a device is turned off 1455, in some examples the device is powered down 1455, in some examples the device is taken off line 1455, in some examples the device is put into another non-use state or mode 1455 with a resulting re-start 1436 when said device is turned on 1436 and its SVS is on and operating 1436. In some examples device use continues 1453 1440 and use is not interrupted.

Superior viewer field of view changes: In some examples an SVS determines the image(s) displayed by determining the location(s) of one or a plurality of viewers in relation to a display screen, and utilizing the viewer(s)'s angle and/or distance to adjust the image(s) displayed, stimulating a view through a real window to said viewer(s). In some examples said simulated view on said display screen is dynamically updated to reflect the changing location(s) of one or a plurality of viewers in relation to said display screen by means of one or a plurality of SVS sensors as described elsewhere. In some examples the image(s) received for display are from one or a plurality of remote lenses with a wide enough angle and high enough resolution so that the portion of said received image(s) that is displayed may be adjusted rapidly, smoothly and in real-time to respond directly and quickly to the changing location(s) of said viewer(s). In some examples this process is utilized with stored pre-recorded images whether they are from natural sources such as the real world, from pre-recorded entertainment programs, from synthesized and blended realities such as described elsewhere, or from other stored sources. Alternatively, in some examples said received images may be from one or a plurality of remotely located cameras that have remotely controlled motorized camera functions such as panning, filtering, zooming, etc. and whose images are displayed directly on the display screen; in some examples changes in the location(s) of one or a plurality of viewers with respect to the display screen causes appropriate corresponding commands to be sent to said remotely controlled cameras to adjust their individual remote camera view (s) by panning, tilting, zooming, etc. to provide said simulated view(s) through a real window on said display screen. Alternatively, in some examples said received image(s) may be received from any AID/AID (as described elsewhere) and/or any TP device (as described elsewhere) with a camera function and communication capability for live viewing, and/or with a camera function and storage capability for viewing stored images.

Turning now to FIG. 47, "SVS Changing Field of View Due to Viewer Horizontal Location(s)," in some examples the received image 1460A is larger than the viewing area of a display screen 1462A that in some examples is mounted on a wall 1461A. In some examples an SVS sensor determines the location of a viewer 1464A as described elsewhere. For located viewer 1464A, a horizontal portion 1465A of said received image 1460A is displayed in said display screen's viewing area 1462A as determined by a viewer's angle 1468A between an imaginary line 1467A that is perpendicular to the display screen's center 1466A and an imaginary line between said viewer 1464A and the center of the display screen 1466A. In some examples a plurality of viewers is detected and the location of each viewer with respect to the display screen 1462A is determined by said SVS subsystem as described elsewhere; in some examples for each viewer 1464A that viewer's angle 1468A is determined based on an imaginary line between said viewer 1464A and the center of the display screen 1465A, and in some examples the displayed portion 1465A of the image received 1460A is selected based on a median or average viewing angles of the collection of viewers that are detected and located; that is, the angle 1468A for each viewer 1464A is determined individually, then the set of viewers' angles are determined with respect to the display screen, and known processing means provides the average or best corresponding positioning for the simulated window displayed 1465A that simulates the view seen through a real window from that average or median viewing location. In some examples a plurality of viewers is detected and a recognition subsystem is present and employed to determine the identity of said detected viewers; in some examples a subset of detected viewers is selected based upon identity recognition, with varying preset prioritization or weighting based upon the identity of each recognized viewer (such as the highest priority for the owner of the device in use); and therefore in some examples the simulated window position 1465A that is displayed 1462A provides a more realistic simulated window view for one or a plurality of recognized and prioritized detected viewers.

In some examples a viewer 1464A moves 1464C with respect to the display screen 1462A 1462B, with a change such as from location 1464A to location 1464B with respect to said display screen. Since received image 1460B is larger than the viewing area of the display screen 1462B that in some examples is mounted on a wall 1461B, in some examples an SVS sensor determines the new location of the viewer 1464B as described elsewhere. For located viewer 1464B, a responsively adjusted horizontal portion 1465B of said received image 1460B is displayed in said display screen's viewing area 1462B as determined by said viewer's new angle 1468B between an imaginary line 1467B that is perpendicular to the display screen's center 1466B and an imaginary line between said viewer 1464B and the center of the display screen 1462B. In some examples a subsystem employs means (as described elsewhere) to determine the location of one or a plurality of viewers based on their individual angle(s) with respect to said display screen; and in some examples said subsystem employs known processing means to calculate and select the appropriate image(s) 1465A 1465B for each respective viewer location 1464A 1464B as well as the (optional) dynamic transition(s) as said viewer moves 1464C between locations, in order to simulate a real window's view for the one or a plurality of viewers.

In some examples a viewer starts in position 1464B with angle 1468B with respect to an imaginary line 1467B that is perpendicular to the center 1466B of the plane of the display screen 1462B, which is on the right side of said display, so the portion of received image 1460B determined by processing is the left side of received image 1460B, which is a centered on the Basilica of St. Mary of Health (Basilica di Santa Maria della Salute) 1465B on Venice's Grand Canal. If said viewer keeps a constant distance from said display screen but moves his or her location to the left side of said display with angle 1468A with respect to an imaginary line 1467A that is perpendicular to the center 1466A of the plane of the display screen 1462A, processing would adjust the display to correspond to said viewer's new position 1464A and show the right portion 1465A of received image 1460A.

In some examples said display screen alteration 1465A 1465B in response to said viewer's location change 1464A 1464B with respect to a display screen 1462A 1462B, as well as additional SVS digital display functions as described elsewhere, may be provided by an application designed for use with one or a plurality of display devices that utilize an appropriate viewer sensor and processing means to adjust the image(s) displayed in order to simulate a dynamic window view to one or a plurality of viewers; with said application stored as code on either local storage, remote storage for both; with said application available as a computer program product, a downloadable application, a network service, or in another format. Said application consisting of means for receiving and displaying one or a plurality of images; means for determining the location(s) of one or a plurality of viewers with respect to said display; means for calculating and displaying an appropriate portion of said received image(s) based on angle and/or distance of one or a plurality of viewers from said display; and means for outputting the appropriate portion(s) of said received image(s) on said display screen in order to simulate a dynamic view through a live window for one or a plurality of viewers.

Turning now to FIG. 48, "SVS Changing Field of View Due to Viewer Distance from Screen," in some examples received image 1470A is larger than the viewing area of a display screen 1472A that in some examples is mounted on a wall 1471A. In some examples an SVS sensor determines the location of a viewer 1473A as described elsewhere, wherein said viewer location comprises the distance 1474A between said viewer 1473A and the center of said display screen 1472A; and based on said distance 1474A displays a portion 1475A of said received image 1470A.

In some examples of plurality of viewers is detected and the distance 1474A of each viewer from the center of said display screen 1472A is determined by said SVS subsystem as described elsewhere; in some examples for each viewer 1473A that viewer's distance 1474A from the center of said screen, and in some examples the displayed portion 1475A of the image received 1470A is selected based upon a median or average viewing distance of the collection of viewers that are detected and located; that is, the distance 1474A for each viewer 1473A is determined individually, then the set of viewers' distances are determined with respect to the display screen, and known processing means provides the average or best corresponding simulated window displayed 1475A that simulates the view seen through a real window from that average or median viewing location. In some examples a plurality of viewers is detected and a recognition subsystem is present and employed to determine the identity of said detected viewers; in some examples a subset of detected viewers is selected based upon identity recognition, with varying preset prioritization or weighting based upon the identity of each recognized viewer (such as the highest priority for the owner of the device in use); and therefore in some examples the simulated window position 1475A that is displayed 1472A provides a more realistic simulated window view for one or a plurality of recognized and prioritized detected viewers.

In some examples a viewer 1473A moves 1474C closer with respect to the display screen 1472A 1472B, with a change such as from location 1473A to location 1473B with respect to said display screen. Since received image 1470B is larger than the viewing area of the display screen 1472B that in some examples is mounted on a wall 1471B, in some examples and SVS sensor determines the new location of the viewer 1473B as described elsewhere. For located viewer 1473B, a responsively adjusted portion 1475B of said received image 1470B is displayed in said display screen's viewing area 1472B as determined by said viewer's new distance 1474B from the center of said display screen 1472B. In some examples a subsystem employs means (as described elsewhere) to determine the distance of one or a plurality of viewers based upon their individual distance(s) with respect to the center of said display screen; and in some examples said subsystem employs known processing means to calculate and select the appropriate image(s) 1475A 1475B for each respective viewer location 1473A 1473B as well as the (optional) dynamic transition(s) as said viewer moves 1474C between locations, in order to simulate a real window's view for the one or a plurality of viewers.

In some examples the distance 1474B of viewer 1473B from the center of said display screen 1472B corresponds to the distance and lens size at which said received image 1470B is acquired, so that the image received 1470B may be displayed directly on the display screen 1472B; in an example close to that the distance 1474B of 1473B from the center of said display screen 1472B is only slightly different from the distance and lens size at which said received image 1470B is generated, so that the image received 1470B may be adjusted only slightly 1475B before being displayed on the display screen 1472B.

In some examples the distance of viewer 1473B changes such as to the distance of viewer 1473A in which said new distance 1474A increases by distance 1474C, so that the process and adjusted displayed image 1475A is zoomed in and magnified on said display screen to simulate a real window's view at new distance 1474A. As this example illustrates, changes in viewer distance from said display screen may result in some examples in digitally zooming in and in some examples digitally zooming out from the received image(s), or in some examples selecting between a plurality of received images that are gathered with different lenses of different zoom magnifications and then adjusting the appropriately sized image to match a viewer's corresponding distance from a display screen and displaying said appropriately selected and appropriately adjusted image on the display screen.

In some examples a display screen 1462A 1462B 1472A 1472B is flat, one or a plurality of viewers 1464A 1464B 1473A 1473B are detected with respect to said display screen and the location(s) of said viewer(s) is based on the angle(s) of said viewer(s) with respect to an imaginary line 1467A 1467B that is perpendicular to the center of said display screen and a line that extends between one or a plurality of viewers and the center of said display screen, and the location (s) of said bviewer(s) is also based on the distance of one or a plurality of viewers from the center of said display screen; and in some examples said subsystem employs known processing means to calculate and select the appropriate image (s) for the location(s) of one or a plurality of viewer(s) as well as the (optional) dynamic transition(s) as said viewer(s) move between locations, in order to simulate a real window's view for the one or a plurality of viewers.

CONTINUOUS DIGITAL REALITY/AUTOMATED ON-OFF: Continuous Digital Reality Subsystem/Service: When a user stands up and looks out a physical window the world is already there, without any need to turn the outside on when looking at the window, or turn the window off when the user leaves the room. Similarly, when a user goes to a closed door and opens it and walks through the door the next room or the outside is already there, without any need to turn on the new place, or any need to turn off the place after leaving it. "Physical reality" is always "present" and "senseable" whenever we are in it, when we turn to view it, or when we enter a new place. In the ARTPM "digital reality" works in a parallel way to "physical reality"—the user's digital reality is continuous and present, but this is produced electronically so that digital reality is automatically visible, usable and ready. In some examples users do not need to take the steps required by current electronic devices and digital communications, where each device must be turned on and off (like booting a PC, then loading video conferencing software and using it to select someone to call, then using it to make a video phone call); and each current electronic device's connection must be made separately (like making a mobile phone call or starting and setting up a video conference); and in our current digital electronic devices when most "uses" are ended a device's use is finished and that feature must be closed or the device must be turned off, like running shutdown on a PC, using a remote to turn the power off on a television, or hanging up a phone call.

Automated On/Off/On/Off Devices: Many consumer electronic devices attempt to simplify turning devices on and off somewhat by adding immediate on/off, which is often achieved by means of a power-down state where a device's most recent operation(s) is suspended and saved (such as a home theater's settings when that system includes multiple linked devices), ready to be resumed in that state when power is restored. For example, a major PC annoyance is being forced to wait while the PC boots up (e.g., turns on) and then wait again when the PC shuts down (e.g., turns off). After 30 years of PC development, it has been said that the large revenues from selling PC operating systems forces users to see and use (and endure the frustrations of) a PC operating system—a component every other consumer electronic device has embedded and made invisible (at far lower revenues than the PC's operating system vendor receives).

Figure 49A:
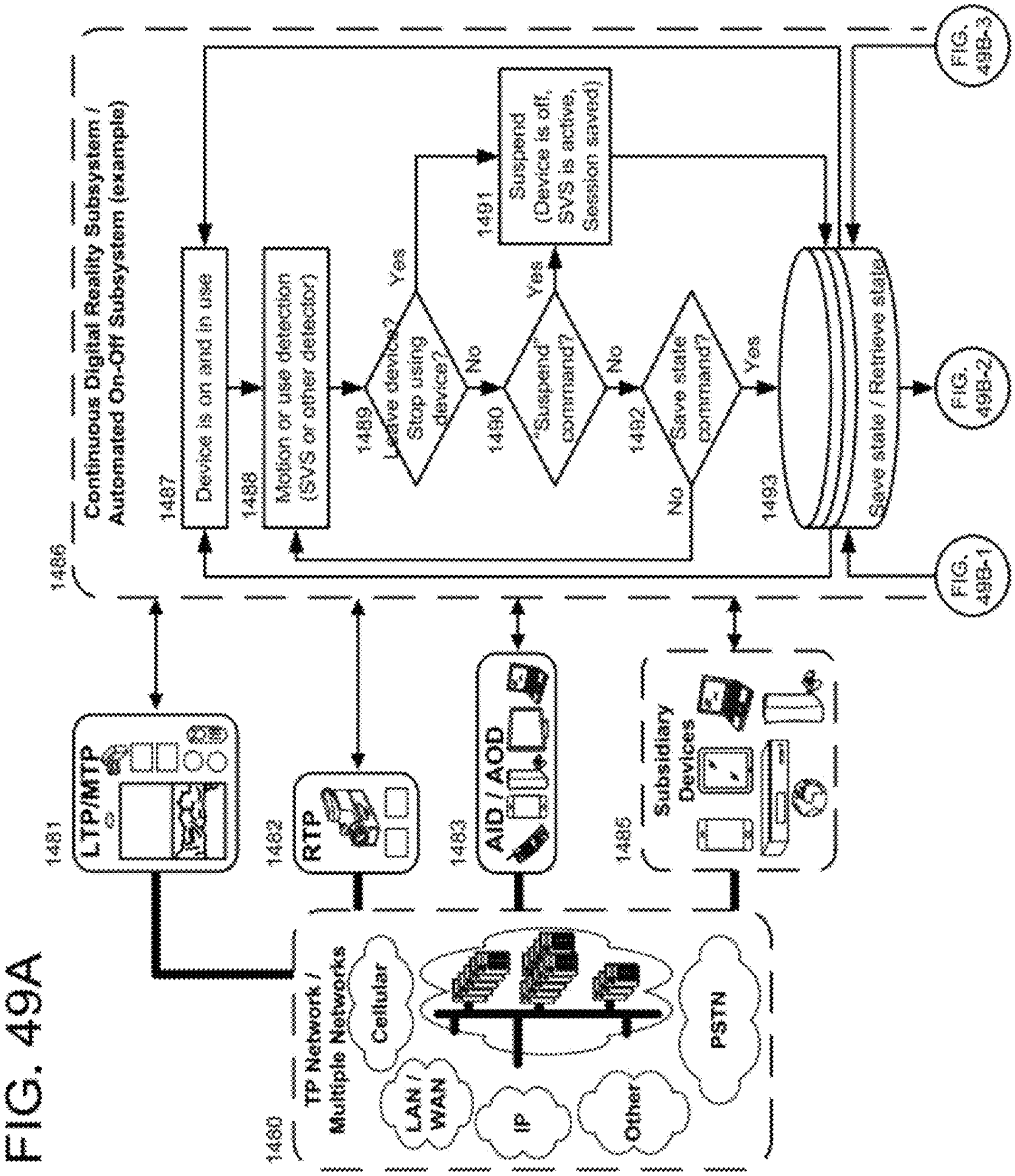
FIG. 49 is a pictorial block diagram that illustrates some examples of a continuous digital reality that is present in response to the presence of a specific identity.
Figure 49B:
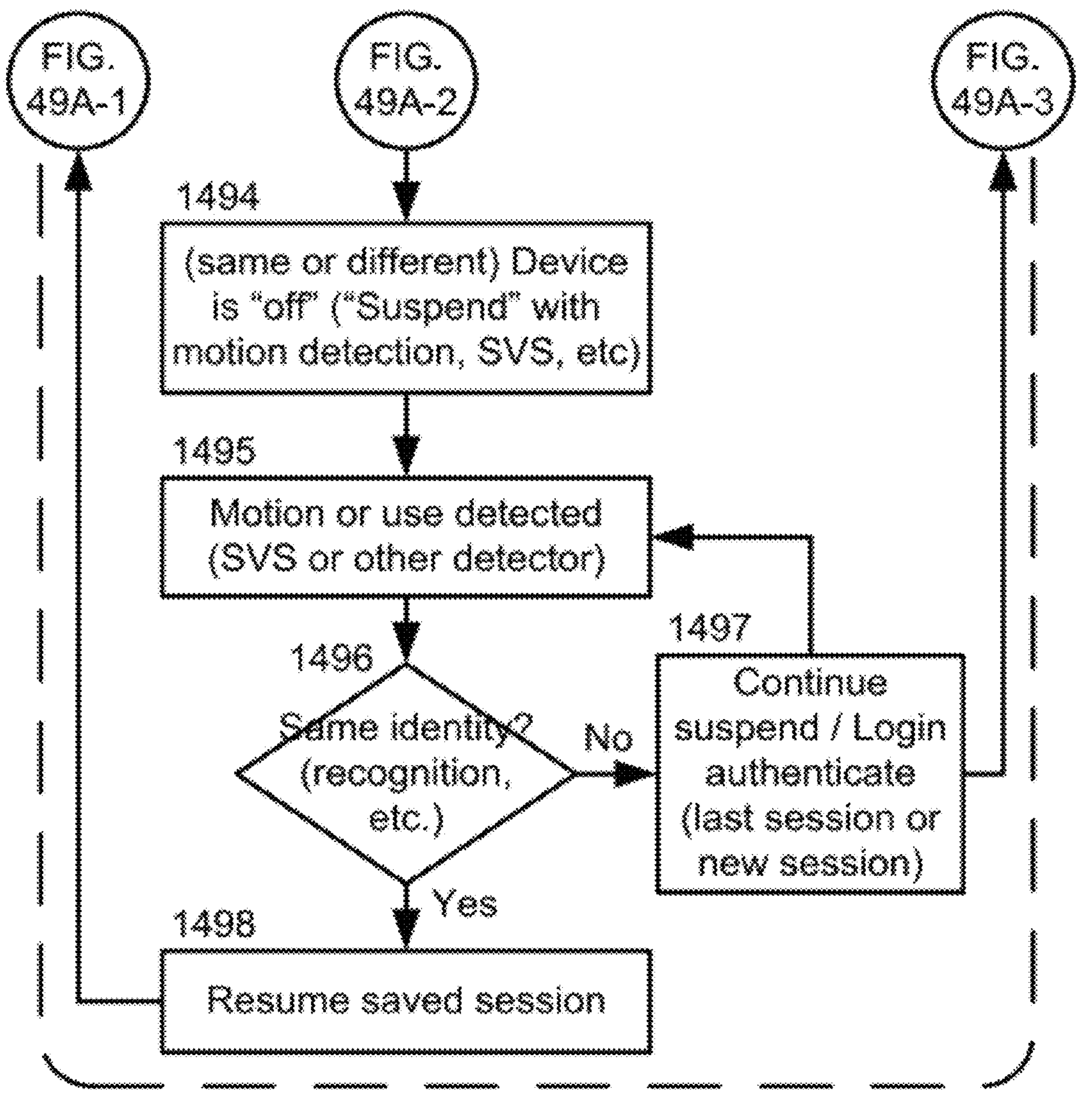

FIG. 49, "Continuous Digital Reality (Auto On-Off)": In some examples digital reality works in a parallel way to physical reality (which is always present without needing to be turned on and off). In some examples a TP device is on and includes an SVS or another type of in-use detector, including in some examples a detector or subsystem that can determine the identity of a user. In some examples said detector(s) determine that a device is no longer in use, and in some examples device use is manually suspended, and in some examples the device's current state is then saved as part of putting a device in a suspended state. In some examples use begins with a suspended device such as by entering a room where said device is present but suspended, and in some examples a detector recognizes both presence and identity and retrieves said identity's saved state. In some examples a device is in use by an identity, and said identity begins use of a second device, and in some examples the second device's detector recognizes both presence and identity and retrieves said identity's current state, and in some examples retrieves said identity's most recently saved state. In some examples detection is performed without recognition, or in some examples detection and recognition are performed but a user wants to use a different identity; in some examples a user therefore performs login and authentication, and the new identity's last saved state is retrieved and restored. In some examples the result is automated simultaneous digital reality by a plurality of devices, and in some examples the result is manually directed digital reality by a plurality of devices.

Turning now to FIG. 49, "Continuous Digital Reality Subsystem/Service (Automated On-Off Subsystem)," in some examples an LTP 1481 may include continuous digital reality/automated on-off as one or a plurality of subsystems; in some examples an MTP 1481 may include continuous digital reality/automated on-off as one or a plurality of subsystems; in some examples an RTP 1482 may include continuous digital reality/automated on-off as one or a plurality of subsystems; in some examples an AID/AOD 1483 that is running a VTP may include continuous digital reality/automated on-off as one or a plurality of subsystems, in some examples a TP subsidiary device 1485 that is running RCTP may include continuous digital reality/automated on-off as one or a plurality of subsystems, in some examples another type of electronic device(s) that are enabled with an in-use detector 1488 1495 (such as in some examples an SVS, in some examples a motion detector, and in some examples another type of in-use detector) may include continuous digital reality and/or automated on-off as one or a plurality of subsystems; and in some examples another type of electronic device that is enabled with an in-use detector and user recognition (for more secure on/off) may include continuous digital reality and/or automated on-off as one or a plurality of subsystems. In some examples said devices 1481 1482 1483 1485 are connected by one or a plurality of disparate networks 1480; in some examples parts of a continuous digital reality/automated on-off subsystem may be distributed such that various functions (such as in some examples "state" storage, identity recognition, etc.) are located in local and/or remote devices, storage, and media so that various steps are performed separately and link through said network(s) 1480; in some examples the equivalent of a continuous digital reality/automated on-off subsystem may be provided by means other than a device's local subsystem and provided over said network(s) 1480.

Subsystem summary of continuous digital reality/Automated on-off: In some examples a user has one identity, and in some examples a user has multiple identities as described in FIG. 166 through 175 and elsewhere so that in various examples "user(s)" and "identity(ies)" may each be employed to describe continuous digital presence. In some examples said process 1486 includes both continuous digital reality 1486 and automated on/off of continuous digital reality devices, such that a continuous digital reality 1486 is automatically turned on and connected when one or a plurality of appropriate and enabled devices 1481 1482 1483 1485 is in use, in some examples when one or a plurality of said devices is added to use, in some examples when one or a plurality of said devices is present and capable of being used, etc.; and also said continuous digital reality 1486 is automatically saved, suspended and disconnected when the use of, or capability of using one or a plurality of appropriate and enabled devices 1481 1482 1483 1485 is ended—in order to simulate the experience of an "always on" continuous digital reality presence for an identity. In some examples when an identity enters a room 1495 the appropriate and enabled devices 1494 1481 1482 1483 1485 immediately and automatically turn on 1498 and reestablish said identity's current session(s) 1493 1487 as a continuous digital reality; and when said identity exits a room 1488 1489 the appropriate and enabled devices 1481 1482 1483 1485 immediately and automatically suspend their current session(s) 1491 and save that "state" 1493 in local and/or remote storage for retrieval and use by that identity's other appropriate and enabled devices 1494 1495 1481 1482 1483 1485—and as soon said other devices are picked up or other preparation for use is begun 1495, said other devices 1481 1482 1483 1485 immediately and automatically turn on 1495 and reestablish said identity's current session(s) 1496 1498 1493 1487 as a continuous digital reality. In a similar fashion said process may be controlled manually to end use of one or a plurality of appropriate and enabled devices 1490 1491 1492 1493, or to manually change identity when initiating use 1496 1497 1487 of appropriate and enabled devices 1481 1482 1483 1485, or to change identity at any time 1496 1497 1487 during use of said devices; and in some examples when a user changes to a different identity 1496 that other identity's digital reality state(s) is retrieved from local and/or remote storage and reestablished 1493 1487 (in some examples including login and authentication of said different identity to provide security and/or identity control).

Appropriate and enabled devices: In some examples the process 1486 can begin with a device that is on and in use 1487 1481 1482 1483 1485 and has an in-use detector 1488 1495 (which in some examples is an SVS 1488 1495, in some examples a motion detector 1488 1495, an in some examples another type of detector or subsystem that may be used to determine usage 1488 1495 and/or an identity's presence 1488 1495, or other means that determine presence of in some examples a user 1488 1495, in some examples a recognized identity 1488 1495, or in some examples a person in front of a device 1488 1495). In some examples the process 1486 can begin with a device that is on and in use 1487 1481 1482 1483 1485 and has usage detection 1488 such as in some examples a timer that tracks inputs from a user I/O device 1488, or in some examples any other indication of use of a device 1488.

Identity or user detection: In some examples an identity is present 1488 then leaves the detected "presence" 1489 of said device 1481 1482 1483 1485 (including in some examples exiting a room 1489, in some examples putting a portable device away 1489, in some examples other actions that indicate that a device is no longer in use 1489); in some examples that result, said device is automatically put into a suspend state 1491 (which in some examples the device is powered down [such as appearing turned off but being maintained in a ready-to-be-turned-on-immediately state] 1491, in some examples motion detector is active 1491 1488, in some examples use detection is active 1491 1488, in some examples said identity's session is saved 1491 1493 in local and/or remote storage so that it may be restored on the same device or on a different device [as described in FIG. 113 and elsewhere]).

Use detection: In some examples a device 1481 1482 1483 1485 is in use 1487 1488 then an identity or a user stops using said device 1489 (including in some examples not using said device for a period of time 1489, in some examples when a remotely used device 1482 1483 1485 has one or a plurality of remote users, in some examples when a remotely used observation device 1482 has one or a plurality of remote observers, in some examples triggering an indicator that a device is no longer in use 1489 such as in some examples powering down a device, in some examples ceasing another type of active indication that a device is in use 1489); in some examples that result, said device is automatically put into a "suspend" state 1491 that includes saving said device's state (as described in FIG. 113 and elsewhere).

Suspend device: In some examples a device 1481 1482 1483 1485 is in use 1487 1488 and an identity or a user provides a manual command to suspend 1490 1491 1493 said device (with suspend as described elsewhere), which in some examples a suspend command 1490 may be entered by means of a user I/O device 1490 1491 1493, in some examples a suspend command 1490 may be a gesture 1490 1491 1493, in some examples a suspend command 1490 may be verbal 1490 1491 1493, or in some examples a suspend command 1490 may be another type of user indication to suspend use of a particular device 1490 1491 1493—whereby "suspend" includes saving said device's state (as described in FIG. 113 and elsewhere).

Save state: In some examples a device 1481 1482 1483 1485 is in use 1487 1488 and an identity or a user provides a manual command to save the current session and state 1492 1493 of said device (as described in FIG. 113 and elsewhere), which in some examples said save-state command 1490 may be entered by means of a user I/O device 1492 1493, in some examples said save-state command may be a gesture 1492 1493, in some examples said save-state command may be verbal 1492 1493, or in some examples may be another type of user indication to save the current state of a particular device 1492 1493.

Detecting presence at, or use by a powered down or suspended device: In some examples a device 1481 1482 1483 1485 is suspended 1491 1493 as described above so that certain detectors remain active 1494 1495, and is in a powered down state 1494 such as in some examples when no one is present in a room 1488 1489, in some examples when a portable device is closed or put away 1488 1489, in some examples when a remotely used device 1482 1483 1485 does not have any remote users, in some examples when a remotely used observation device 1482 does not have any remote observers, in some examples when a manual suspend command has been issued 1488 1490, in some examples when there is no indication of use 1488, or in some examples where there is another indication (or lack thereof) that causes device suspension 1488 1490 1491 1493 as described elsewhere. In some examples motion is detected 1495 or use is detected 1495 by means such as entering a room 1495, in some examples by taking out a portable device 1495, in some examples by powering on a device 1495, in some examples by opening the top or cover of a device 1495, in some examples by contacting an observation device to begin observing 1495, in some examples by starting to use a user I/O device that sends a command or an indication of use to said device 1495, in some examples other actions that trigger an indication that a user is present or indicates that a device is in use 1489.

Recognition of previous identity(ies): In some examples when presence or use are detected 1495 said device has identity recognition capability 1496 (such as in some examples face recognition 1496, in some examples fingerprint recognition 1496, in some examples other biometric recognition 1496, or in some examples another type of known recognition capability 1496); in some examples said device does not have recognition capability but is linked to a remote device or service that provides identity recognition 1496; and where identity recognition is available either locally or remotely recognition may be performed 1496. In some examples identity recognition is performed 1496 and the identity who was previously using the device is recognized 1498, and the device's previous state(s) and session(s) are retrieved 1493 (as described in FIG. 113 and elsewhere) in some examples from said device's local storage 1493, in some examples from said device's memory 1493, and in some examples from remote storage 1493. In some examples after the previous state(s) and session(s) are retrieved and restored, said device is on and available for use 1487.

Different identity/Not the previous identity(ies): In some examples identity recognition is performed 1496 and the identity who was previously using the device is not recognized 1498, and therefore the device's previous state(s) and session(s) are not restored; in some examples login and authentication 1497 are required to initiate a new session 1497. In some examples said login and authentication 1497 fail and in this case the device returns to a suspended state 1495 awaiting an appropriate indication(s) of presence or use. In some examples said login and authentication 1497 succeed and in this case that other identity's previous state(s) and session(s) are retrieved 1493 and restored for use 1487 (as described in FIG. 113 and elsewhere) in some examples from said device's local storage 1493, in some examples from said device's memory 1493, and in some examples from remote storage 1493. In some examples after said other identity's previous state(s) and session(s) are retrieved and restored, said device is on and available for use 1487.

Automated simultaneous digital reality use by a plurality of devices: In some examples a first device 1487 1481 1482 1483 1485 is in use and a user desires to simultaneously use a second or plurality of appropriate and enabled devices 1496 1481 1482 1483 1485 (herein called "additional device[s]"); in some examples the additional device(s) are turned on automatically by presence or use detection 1495 as soon as they are physically approached 1495, used 1495, powered on 1495, opened 1495, etc. In some examples said additional device(s) have identity recognition capability 1496 (as described elsewhere); in some examples said additional device(s) does not have recognition capability but is linked to a remote device or service that provides identity recognition 1496; and where identity recognition is available either locally or remotely identity recognition may be performed 1496. In some examples identity recognition is performed 1496 and the current identity on said first device is recognized 1498 by said additional device(s); in this case the first device's state(s) and session(s) are accessed and retrieved 1498 1492 1493 1487 by issuing an automated save command 1492 1493 to said first device and performing retrieval 1497 1493 1487 from local and/or remote storage. In some examples after the previous state(s) and session(s) are retrieved and restored 1496 1498 1493, said additional device (s) is on and available for use 1487.

Manual simultaneous digital reality use by a plurality of devices: In some examples the additional device(s) do not include motion detection 1495 and/or use detection 1495 and therefore must be powered on manually rather than automatically. In some examples the additional device(s) do not include identity recognition 1496 and therefore must be logged into 1497 with the identity in use on said first device 1487 1497; in some examples the first device's state(s) and session(s) are accessed and retrieved by issuing a manual save command 1492 1493 to said first device and after login to said additional device(s) 1497 performing retrieval 1497 1493 resuming said 1487 state(s) and session(s) from said first device's stored state(s) and session(s). In some examples after the previous state(s) and session(s) are retrieved and restored 1496 1498 1493, said additional device(s) is on and available for use 1487.

Figure 50A:
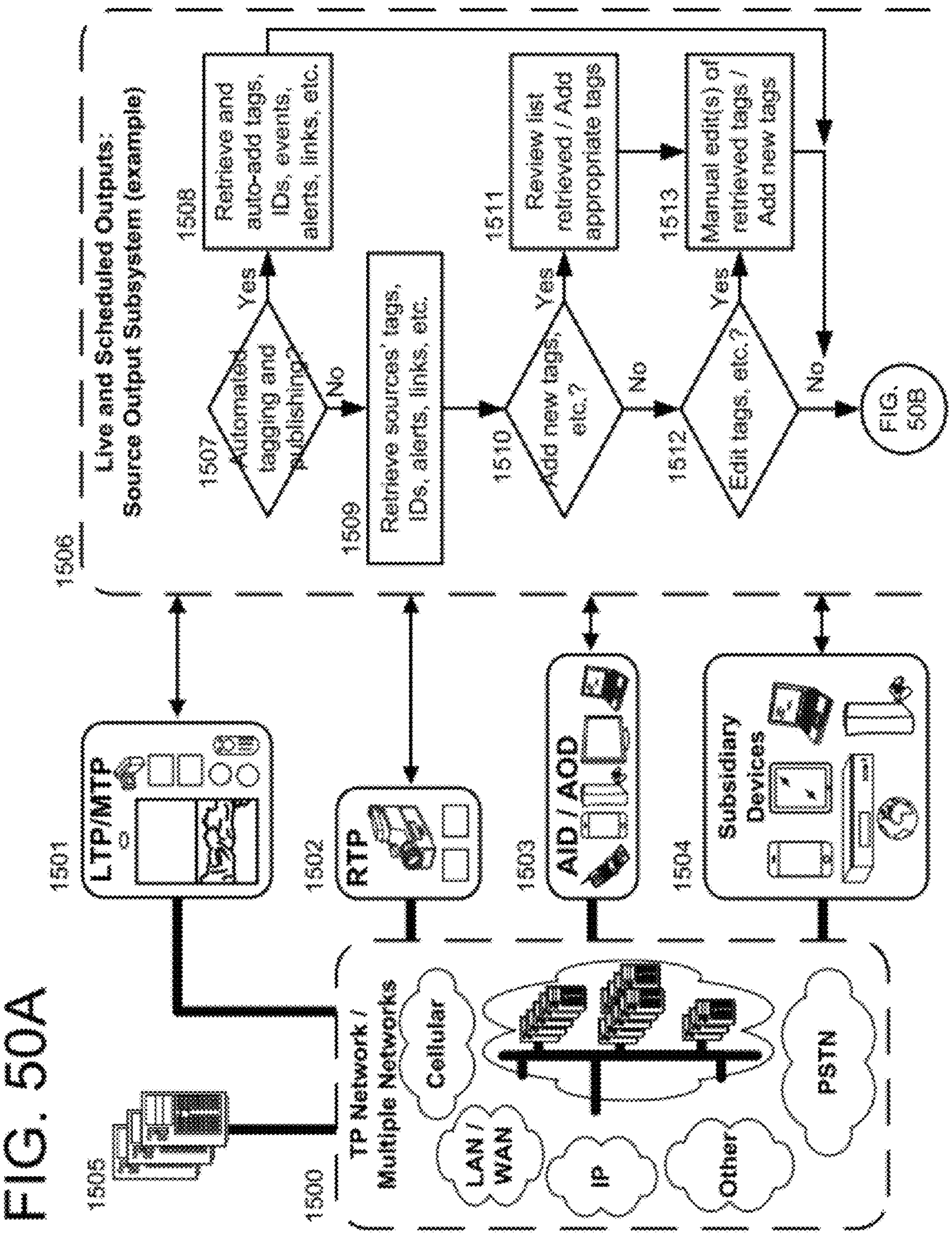
FIG. 50 is a pictorial block diagram that illustrates some examples of publishing TP broadcasts (such as in some examples constructed digital realities from TP devices) so they may be found and used by others (such as in some examples from websites, databases, Electronic Program Guides, channels, networks, etc.).
Figure 50B:
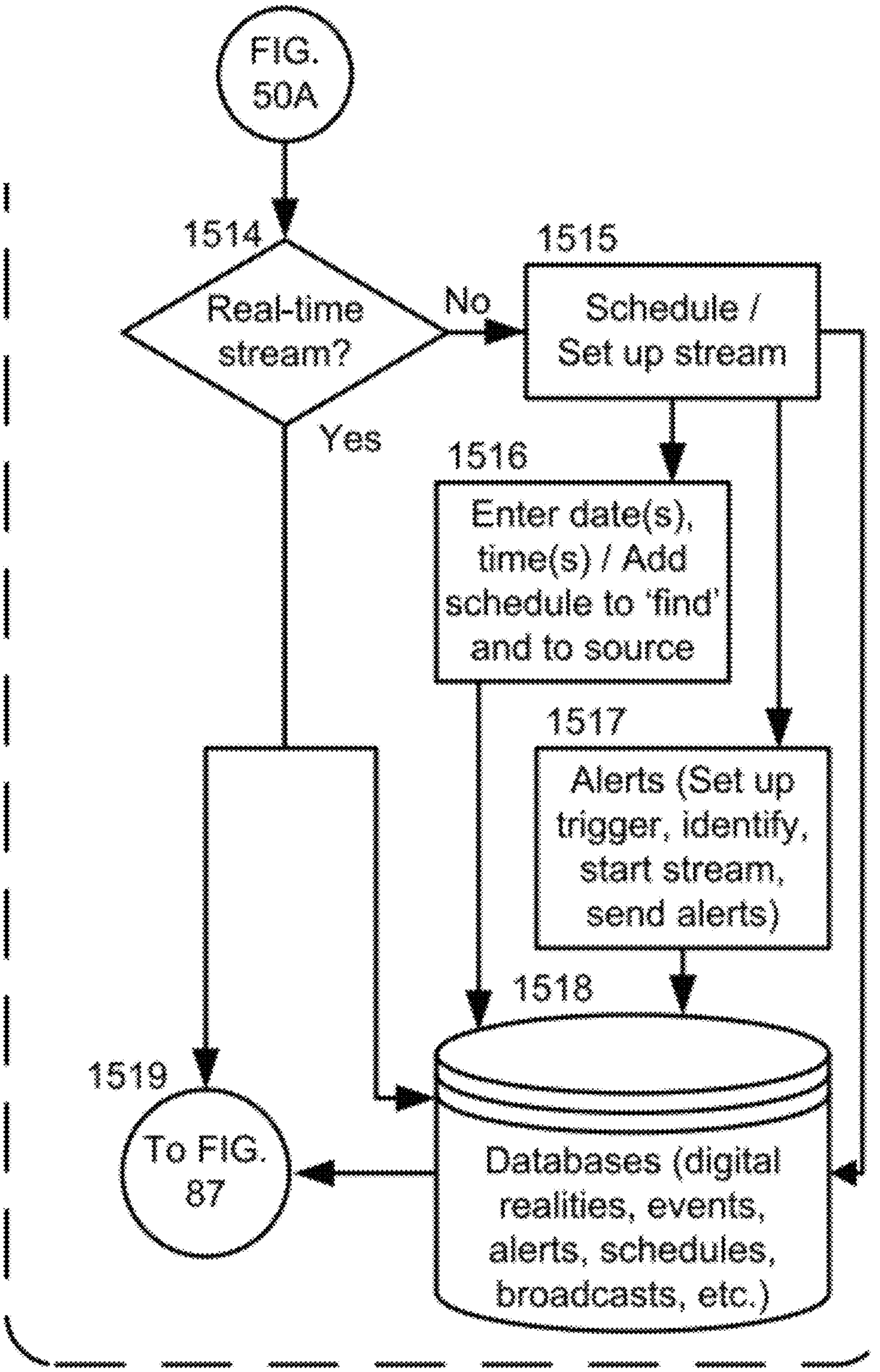

TP DEVICE SOURCE(S) OUTPUT (PUBLISHING) SUBSYSTEM/SYSTEM: FIG. 50, "TP Device Broadcasts": In some examples one or a plurality of digital outputs are produced (such as in some examples TPDP events, in some examples RTP places, in some examples constructed digital realities, in some examples streaming TP sources, in some examples TP Broadcasts, in some examples TP directories, and in some examples other digital sources or stored resources created or provided over one or a plurality of networks). In some examples means are provided for distributing said sources and/or resources, and in some examples means are provided for finding said sources and/or resources. In some examples said means include automated metadata naming and tagging, and in some examples said means include manual metadata naming and tagging. In some examples outputs are distributed in real time as they are produced, and in some examples outputs are recorded and stored so they may be scheduled for streamed distribution, or retrieved on demand. In some examples outputs may be associated with schedules, in some examples with alerts, in some examples with trigger events, in some examples with stored finding means (such as in some examples electronic program guides, in some examples topic-based channels, in some examples search engines, in some examples database lookups, and in some examples dashboards), in some examples API's for third-party access, and in some examples by other distribution and finding means. In some examples related information can be provided with output sources or resources, and in some examples links or other means to associate related information can be provided with output sources or resources.

Turning now to FIG. 50, "TP Device Source(s) Output Subsystem," some examples are illustrated whereby individual, corporate and other types of contributors may make their own sources (such as in some examples TPDP events, in some examples RTP places, in some examples constructed digital realities, in some examples streaming TP sources, in some examples TP broadcasts, in some examples other digital sources created or provided by one or a plurality of types of Teleportal devices as described elsewhere) available to others over one or a plurality of networks. Since Teleportal devices make it possible to support and provide a plurality of existing and new types of streaming sources (such as described elsewhere), said FIG. 50, "TP Device Source(s) Output Subsystem," illustrates some examples of systems, methods, processes, applications and subsystems that support the distribution of sources created by various types of contributors and their devices.

In some examples this is accomplished by providing means for distributing sources from individual contributors' devices; in some examples one or a plurality of source(s) is provided by an LTP 1501; in some examples one or a plurality of source(s) is provided by an MTP 1501; in some examples one or a plurality of source(s) is provided by an RTP 1502; in some examples one or a plurality of source(s) is provided by an AID/AOD 1503; in some examples one or a plurality of source(s) is provided by a TP subsidiary device 1504; in some examples one or a plurality of source(s) is provided by a server 1505 (which may include in some examples one or a plurality of servers 1505, in some examples an application[s] 1505, in some examples a database[s] 1505, in some examples a service[s] 1505, in some examples a module within an application that utilizes an API to access a server or service 1505, or in some examples another networked means 1505). In some examples said devices 1501 1502 1503 1504 are connected by one or a plurality of disparate networks 1500. In some examples one or a plurality of sources is received by an LTP 1501; in some examples one or a plurality of sources is received by an MTP 1501; in some examples one or a plurality of sources is received by an RTP 1502; in some examples one or a plurality of sources is received by an AID/AOD 1503; in some examples one or a plurality of sources is received by a TP subsidiary device 1504; in some examples one or a plurality of source(s) is received by a server 1505 (which may include in some examples one or a plurality of applications 1505, in some examples a database[s] 1505, in some examples a service[s] 1505, in some examples a a module within an application that utilizes an API to access a server or service 1505, or in some examples another networked means 1505). and in some examples one or a plurality of sources is received by another type of networked electronic device or communications device.

In some examples parts of a source's processing, functionality or streaming may be distributed such that various functions (such as in some examples creating a source, in some examples altering or blending a source, in some examples categorizing a source, in some examples tagging a source with metadata so that it is named and/or categorized and may be found, in some examples editing a source's category or metadata, in some examples storing a recorded source for later playback and/or streaming, in some examples storing metadata about a source for finding it, connecting to it [if live] or streaming it on demand [if recorded], in some examples subscribing to alerts from it, or in some examples other features or functions) are located in local and/or remote devices, storage, and media so that various steps are performed by separate devices and communicates through said network(s) 1500; in some examples the equivalent of a TP Device Source (s) Output Subsystem may be provided by means other than a device's local subsystem, such as in some examples a server 1505, in some examples a service 1505, in some examples an application 1505, in some examples a service 1505, in some examples a module within a local application that uses an API to access a server or service 1505, and in some examples by other means that are provided over said network(s) 1500.

Automated metadata naming and tagging: In some examples automated tagging 1507 is provided by streaming a portion of a source and utilizing known content analysis means to identify its components (such as in some examples its GPS location, in some examples identifying it's dominant object(s), in some examples identifying it's dominant identity (ies), in some examples identifying it's dominant brand name (s) or product(s), in some examples performing OCR (Optical Character Recognition) on its visible words, or in some examples performing other types of content analysis and identification), then for said identified content retrieving appropriate tags 1508 (which herein includes tags 1508, metadata terms 1508, event names 1508, said event's schedule 1508, potentially related alerts 1508, appropriate links 1508, etc.). If in some examples said auto-retrieved tags 1508 are added to said source 1507 1508 then automated metadata naming and tagging is complete and said source is ready for streaming 1514.

Manual metadata naming and tagging: In some examples manual tagging 1509 1510 1512 is provided by streaming a portion of a source and utilizing known content analysis means to identify its components (as described elsewhere), then for said identified content retrieving appropriate tags 1509 (as described elsewhere). In some examples one or a plurality of said retrieved tags 1509 are added 1510 1511 by displaying said retrieved tags 1509, selecting the specific tags or categories of tags to be added 1510 1511, and adding the selected tags 1511 to that source. In some examples one or a plurality of said retrieved tags 1509 are edited 1512 1513 before being added by displaying said retrieved tags 1509, selecting a specific tag or category of tag to be added 1512 1513, editing said tag (such as in some examples changing its tag name or other associated metadata) or category (such as in some examples changing its category name or other associated metadata), and adding the selected edited tags 1513 two that source. If in some examples said tags are manually added to said source 1509 1510 1512 then manual metadata naming and tagging is complete and said source is ready for streaming 1514.

Outputs: In some examples sources are distributed in real time as they are produced and processed 1514; in some examples sources are recorded and stored so that they may be scheduled for streamed distribution 1515 by specific means such as on a schedule 1515 1516 1519 by entering one or a plurality of specific date(s) and time(s) to a source 1516 including listing it with various "finding" means 1516 1519 as described elsewhere); in some examples sources are set up to recognize trigger events and then send one or a plurality of alerts 1515 1517 1519 (as described elsewhere which in a brief summary includes identifying specified trigger(s) event (s) 1517, focusing the source when said trigger event[s] occur 1517, and sending alerts to appropriate recipients 1517); in some examples sources are set up 1515 and submitted 1515 1518 to be found by other means 1519 that may utilize one or a plurality of databases 1518 1505 as described elsewhere (such as in FIG. 87 and elsewhere which provides some examples such as PlanetCentrals, GoPorts, alerts systems, maps, dashboards, searches, top lists, APIs for third-party services, an ARM boundary, etc.). In some examples said scheduled outputs stored and accessible by means of one or a plurality of said databases may include one or a plurality of EPG's (EPG [Electronic Program Guides] which may in some examples be a channel set up in some examples by an individual, in some examples by a group, in some examples by a corporation, in some examples by a sponsor such as an advertiser, in some examples by a non-profit organization, in some examples by a governance, in some examples by a government, in some examples by a religious organization, or in some example by another type of EPG creator. In some examples an illustration of an EPG is a channel that provides a "world" to live in digitally such as by providing a type of digital background that a recipient may use to automatically replace other backgrounds; in some examples another illustration of an EPG is a channel that provides education such as in some examples for pre-school age children for continuous automatic replacement of other backgrounds, and in some examples for other grade levels; in some examples another illustration of an EPG is a channel that provides simulated live moving components to include in constructing one's digital backgrounds such as wildlife for naturalists, superheroes for comic book fans, major weapons such as tanks and aerial drones for military fans, and other types of components for other types of interests; and in some examples a plurality of other types of EPGs may be provided. In some examples a collection of channels, each with an EPG, may be provided as a network such as in some examples by an individual, in some examples by a governance, in some examples by a school system, in some examples by a corporation, in some examples by a sponsor, in some examples by a government, and in some examples by another type of source.

As a result in some examples personalized real-time sources 1514, in some examples scheduled sources 1515 1516, in some examples dynamically triggered sources (such as with alerts) 1515 1517, and in some examples "findable" sources may be provided directly to users 1518 1505 or in an accessible networked resource for potential users 1518 1505. In some examples said sources 1514 1515 1516 1517 1518 1505 may have their schedule or metadata information provided on demand by various finding means 1518 1519 1505. With either a current stream 1514 or metadata information 1515 1516 1517 1518 1519 1505 users may be able to branch immediately to perform various functions such as in some examples searching for related sources, in some examples altering an ARM boundary to include or exclude a particular source(s), in some examples adding a source to favorites, in some examples setting a reminder to use a source at a future date/time, in some examples recording a source now in real-time, in some examples scheduling the recording of a source at a future date/time when it is scheduled to be provided (such as on an EPG), etc.

In some examples links may be provided with a real-time source 1514 1519, or in some examples links may be provided with a source's metadata 1518 1519 1505, or in some examples links may be provided with a source's scheduled listing in a "finding" means 1515 1518 1519 1505 such as a top list or an electronic program guide; in these and other examples said links may provide access to related information, in some examples access to related sources, in some examples access to related vendors, in some examples access to related e-commerce purchases, in some examples access to advertisements, in some examples access to marketing information, in some examples access to interactive applications, in some examples access to individuals or identities, in some examples access to directories, in some examples access to pre-defined "canned" searches, etc. These various links may be provided in some examples as a list, in some examples as an interactive application, in some examples as a widget, in some examples as an interface component, in some examples as a portlet, in some examples as a servlet, in some examples as an API, etc.

LANGUAGE TRANSLATION: Physical reality is geographically local, narrow and—unless one or a plurality of the people in a physical place is a traveler—predominantly a single language environment; the local language is typically spoken by everyone. The ARTPM (Alternate Reality Teleportal Machine) illustrates means for SPLS's (Shared Planetary Life Spaces) in which one or a plurality of connections, digital realities, IPTR uses are (optionally) on. These utilize networks so may (optionally and in some examples frequently) include people who are connected but speak different languages, and in some examples connect some people who are fluent in two or a plurality of different languages. Thus, there is a need for simple and direct communications between people who each speak one or a plurality of different languages, with a high level of automation, convenience and flexibility.

Figure 51:
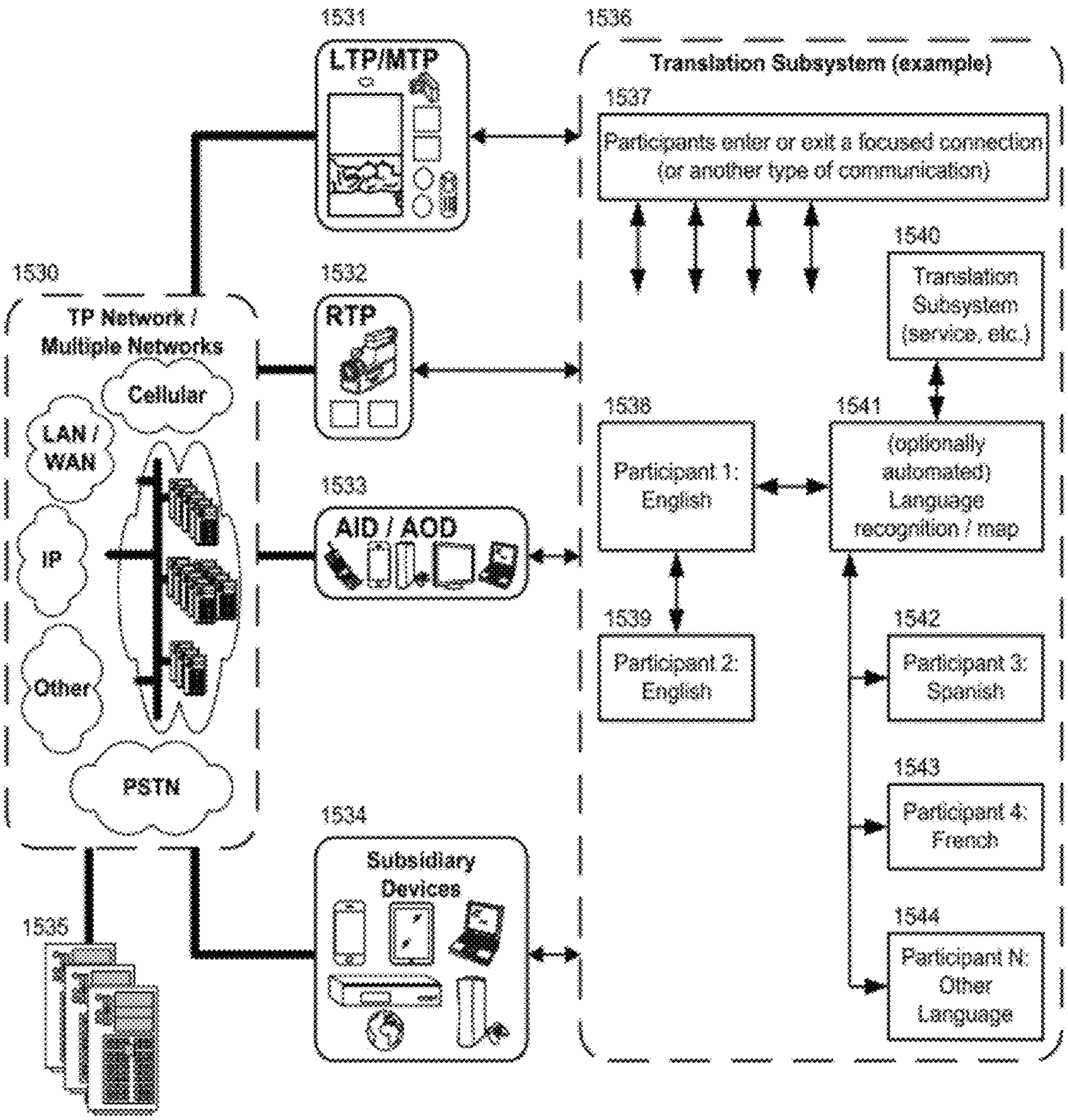
FIG. 51 is a pictorial block diagram that illustrates some examples of language translation so that people who speak different languages may communicate directly, in some examples with automated recognition so the translation facility is transparent to use.

FIG. 51, "Language Translation (Automated or Manual Recognition)": In some examples TP devices connect people who speak different languages, so in some examples language translation is provided. In some examples there is automated recognition and specification of each participant's (different) languages such as in some examples by voice sampling, in some examples by each identity's profile's language settings, in some examples by each identity's location settings, in some examples by other automated means or stored data; and in some examples there is manual recognition and specification of each participant's language(s). In some examples as each participant enters a communication language recognition automatically determines the participant's language, and in some examples that determination is performed manually. Said recognized language for each participant is used for both that participant's input to language translation, and for that participant's output from language translation. In some examples an automated language translation process adjusts the translation mapping as a plurality of participants enter or exit a communication, so that each participant's speech is received and translated and output as needed for each of the other participants. Said translations are performed in parallel so that a plurality of participants each speaks and hears in their own respective and different languages. In some examples language translation and speech synthesis are performed by any of a variety of means. In some examples language translation is performed on text, on documents, on presentations, and on other digital formats in addition to spoken language. In some examples language translations may also be recorded as text in one or a plurality of languages, so as to produce a transcript of a communication in one or a plurality of languages for the respective participants in the communication.

Turning now to FIG. 51, "Language Translation (Automated or Manual Recognition)," some examples are illustrated in which there is automated recognition of different languages (by voice sampling) or automated recognition of each known identity's language settings (by utilizing profile settings or other stored data), with automated language translation; some examples in which there is automated recognition of different languages or automated recognition of each known identity's language settings, with manual override to turn off automated translation; and some examples in which there is manual recognition of different languages, with automated translation. As a result both logged in users and anonymous users who speak different languages from each other can communicate in their native languages with (optional) automated language recognition and language translations so they are each able to speak and hear each other in a language in which they are fluent.

In some examples an LTP 1531 may include language recognition 1541 and/or language translation 1540; in some examples an MTP 1531 may include language recognition 1541 and/or language translation 1540; in some examples an RTP 1532 may include language recognition 1541 and/or language translation 1540; in some examples an AID/AOD 1533 that is running a VTP may include language recognition 1541 and/or language translation 1540; in some examples a TP subsidiary device 1534 (as described elsewhere) that is running RCTP may include language recognition 1541 and/or language translation 1540; in some examples one or a plurality of networked systems 1535 may include language recognition 1541 and/or language translation 1540 (such as in some examples a server[s] 1535, in some examples an application[s] 1535, in some examples a database[s] 1535, in some examples a service[s] 1535, in some examples a module within an application that utilizes an API to access a server or service 1535, or in some examples another networked means 1535); in some examples other known devices may include language recognition 1541 and/or language translation 1540 such as in some examples a mobile cellular telephone; in some examples a landline phone utilizing POTS (Plain Old Telephone Service); in some examples a PC computer, laptop, netbook, pad or tablet, or another device that includes communications; in some examples language recognition may be provided as a network subsystem 1535 1536 1541, a network service 1535 1536 1541, or by other remote means over a network 1535 such as an application, a translation server, etc.; in some examples language translation may be provided as a network subsystem 1535 1536 1540, a network service 1535 1536 1540, or by other remote means over a network 1535 such as an application, a translation server, etc.; in some examples another type of networked electronic device 1534 may include language recognition 1541 and/or language translation 1540.

In some examples automated language recognition 1541 and/or language translation 1540 (which are herein collectively known as a "translation subsystem" 1536) may take the form of an entirely hardware embodiment that is located in one or a plurality of locations and provided by one or a plurality of vendors, in some examples an entirely software embodiment that is located in one or a plurality of locations and provided by one or a plurality of vendors, or in some examples a combination of hardware and software that is located in one or a plurality of locations and provided by one or a plurality of vendors; in some examples automated language recognition 1541 and/or language translation 1540 may take the form of a computer program product (e.g., an unmodifiable or customizable computer software product) on a computer-readable storage medium; and in some examples automated language recognition 1541 and/or language translation 1540 may take the form of a web-implemented software product, module, component, and/or service (including a Web service accessible by means of an API for utilization by other applications and/or services, such as in some examples communication services). In some examples said devices, hardware, software, systems, services, applications, etc. 1536 are connected by one or a plurality of disparate networks 1530; in some examples parts of said language recognition 1541 and/or language translation 1540 may be distributed such that various functions are located in local and/or remote devices, storage, and media so that various steps are performed separately and link through said network(s) 1530; in some examples the equivalent of said language recognition 1541 and/or said language translation 1540 may be provided by means other than exemplified herein and provided over are said network(s) 1530.

As a process, method and/or system (which may be implemented in a machine, hardware, software, service, application, module or by other means), language recognition 1541 may be automated or manually controlled. It includes steps such as identifying a fluent language for each Participant in a communication, and automatically assigning a translation function when the fluent language of the respective Participants differ, and that effects a translator function (or subsystem, application, etc.) to be inserted into the spoken and/or text communications between those respective Participants.

In some examples the process 1536 begins when one or a plurality of participants enters 1537 or exits 1537 a focused connection or another type of electronic communication over a network (herein collectively named a "communication" 1537), such as in some examples Participant 1 speaks English 1538, in some examples Participant 2 speaks English 1539, in some examples Participant 3 speaks Spanish 1542, and in some examples Participant 4 speaks French 1543; while in some examples each additional Participant N may speak another and different language 1544. In some examples as each Participant 1 through N 1538 1539 1542 1543 1544 enters said communication 1537 a language recognition process 1541 automatically determines at least one of each new Participant's fluently spoken language(s). In some examples as each Participant 1 through N 1538 1539 1542 1543 1544 enters said communication 1537 a language recognition process 1541 does not determine a new Participant's language but instead waits for a manual indication of a Participant's language by means of a user interface or command, in order to determine which language translation is needed by each Participant. Said language translation user interface may also receive and employ other known translation instructions or commands such as in some examples source language(s), target language(s), transcription (as described below), e-mail transcription, archive transcription, archive recorded communication, a repeat and clarify option, a repeat and re-translate option, a translate file or attachment option, and/or other language translation options.

In some examples of an automated language recognition process 1541, as each Participants speaks voice sampling is performed by known means to determine at least one of each Participant's fluently spoken language(s) 1541, and said language data may be used both for input language recognition and/or for output language generation. In some examples of an automated language recognition process 1541, each Participant's identity is known (such as in some examples if they are members of an SPLS, in some examples if they are employees of a Corporation and logged into a corporate network, and in some examples by other identification means); in such a case the language recognition process 1541 may (optionally) determine the identity of a new Participant 1538 1539 1542 1543 1544, retrieve said identity's directory entry, user profile data or other identity data; and in some examples utilize a "native language" attribute in said Participant's retrievable data to determine at least one of each Participant's fluently spoken language(s) 1541. In some examples of an automated language recognition process 1541, each Participant's identity is known (as described elsewhere) but one or a plurality of Participants does not have a retrievable "native language" data attribute; in such a case the language recognition process 1541 may (optionally) determine a likely fluent spoken language language for said new known Participant by utilizing retrievable identity data such as in some examples a current home address, in some examples a current business or work address, in some examples a current telephone country code and/or area code, in some examples GPS data such as provided by a cellular telephone, in some examples of GPS data such as provided by another type of device, and in some examples other retrievable location indicating data to determine at least one of each Participant's fluently spoken language(s) 1541 in that geographic region.

In some examples of an automated language recognition process, as Participant 1 1538 and Participant 2 1539 communicate directly, an automated language recognition process 1541 would recognize that Participant 1 speaks English 1538 and Participant 2 also speaks English 1539, in which case all the Participants speak the same language and said language recognition process 1541 would not initiate language translation 1540; in addition, said automated language recognition process 1541 would not perform another language recognition 1541 until a Participant enters 1537 or exits 1537 said communication 1538 1539.

In some examples of an automated language recognition process, as Participant 1 1538 and Participant 2 1539 communicate directly, Spanish-speaking Participant 3 1542 is present from the beginning of a communication 1538 1539 1542, and in some examples Spanish-speaking Participant 3 1542 joins a single language (English) communication after it has begun; in either case an automated language recognition process 1541 recognizes that Participant 1 speaks English

1538 and Participant 2 also speaks English 1539 but Participant 3 1542 speaks Spanish; in which case said automated language recognition process 1541 would map the input and output language(s) of each Participant and initiate language translation 1540; as a result, Participant 3's 1542 spoken and/or written communications would be translated into English by a translation subsystem 1540 before being received by Participant 1 1538 and Participant 2 1539; in parallel, it would initiate language translation 1540 such that Participant 1's 1538 and Participant 2's 1539 spoken and/or written communications would be translated into Spanish by a translation subsystem 1540 before being received by Participant 3 1542; in addition, said automated language recognition process 1541 would not perform another language recognition 1541 until a Participant enters 1537 or exits 1537 said communication 1538 1539 1542.

In some examples of an automated language recognition process, as Participant 1 1538 and Participant 2 1539 and Participant 3 1542 communicate directly, French-speaking Participant 4 1543 is present from the beginning of a communication 1538 1539 1542 1543, and in some examples French-speaking Participant 4 1543 joins a two-language (English and Spanish) three-party communication after it has begun; in either case an automated language recognition process 1541 recognizes that English is spoken by Participants 1 1538 and 2, Spanish is spoken by Participant 3 1542, and French is spoken by Participant 4 1543; in which case said language recognition process 1541 would initiate language translation 1540 such that Participant 3's 1542 spoken Spanish communications and/or written Spanish communications would be translated into English for Participants 1 1538 and 2 1539, and into French for Participant 4 1543, by a translation subsystem 1540 before being received by Participants 1 1538 and 2 1539 and 4 1543; in parallel, it would initiate language translation 1540 such that Participant 4's 1542 spoken French communications and/or written French communications would be translated into English for Participants 1 1538 and 2 1539, and into Spanish for Participant 3 1542, by a translation subsystem 1540 before being received by Participants 1 1538 and 2 1539 and 3 1542; in parallel, it would initiate language translation 1540 such that Participants 1's 1538 and 2's 1539 spoken English communications and/or written English communications would be translated into Spanish for Participant 3 1542, and into French for Participant 4 1543, by a translation subsystem 1540 before being received by Participant 3 1542 and by Participant 4 1543; in addition, said automated language recognition process 1541 would not perform another language recognition 1541 until a Participant enters 1537 or exits 1537 said communication 1538 1539 1542.

In another example, an automated language recognition process 1541 would adjust the translation mapping 1540 as Participants 1 through N 1538 1539 1542 1543 1544 enter 1537 or exit 1537 communication in order to provide parallel and simultaneous translation(s) 1544 for each of the Participants in said communication. In some examples entering 1537 a communication may mean an appropriate translation indication as described elsewhere. In some examples exiting 1537 may mean leaving a communication 1537 1541, and in some examples exiting 1537 may mean temporarily suspending a communication (including in some examples exiting a room, in some examples putting a portable communication device away, in some examples logging out as an identity, in some examples a manual suspend command, in some examples other actions that indicate that a device is no longer in use such as by that device entering a suspended state, or in some examples other temporary suspend use indicators as described elsewhere).

In some examples known means are used to store, retrieve and process the respective language designation of each of the Participants in a communication; in some examples known means are used to transmit to each calling device in a communication one or a plurality of Participants' language designation(s) such that said designation(s) may be stored, retrieved and used to process the respective translation(s) required to receive each Participant's spoken and/or text communications; in some examples known means are used to transmit to each calling device in a communication one or a plurality of Participants' language designation(s) such that said designation(s) may be stored, retrieved and used to process the respective translation(s) required to transmit that Participant's spoken and/or text communications. In some examples known means are used to transmit to each calling device in a communication one or a plurality of Participants' language designation(s) such that each device may provide appropriate and separate language processing when various components are distributed to the respective devices (such as spoken translation and/or text translation).

In some examples known means are used to transmit to each calling device in a communication one or a plurality of Participants' language designation(s) such that said designation(s) may be manually modified or controlled by each Participant in a communication. In some examples a calling device(s) and a called device(s) are in one or a plurality of different communication systems and known means are used to transmit the one or a plurality of Participants' language designation(s) according to the call signaling of each respective communication system.

In some examples of networked communications a translation function 1540 is dynamically inserted in a communication for translating spoken and/or text communications that are directed to a Participant into a language in which that Participant is fluent. In some examples communications are direct between devices but by means of a language recognition function in one or a plurality of said communicating devices 1541, a translation service(s) 1540 may be automatically or manually inserted in said direct communications (as described elsewhere). In some examples each Participant's device 1538 1539 1542 1543 1544, each language recognition component 1541, and each translator 1540 (whether a translation subsystem, a translation service, a translation module, a translation application, or another known translation means) may use the same local or distributed set of language translation components, or alternatively may use a different set of local or distributed language translation components, in order to effect real-time translation or near real-time translation; with the distribution of various functional components not limiting the implementation of language recognition 1541 and/or language translation 1540.

In some examples a plurality of language translations 1540 are performed in parallel so that a plurality of Participants in a communication, who are each fluent in a different language may simultaneously receive each spoken and/or text communication in their respective and different languages; which may be effected in some examples by parallel processing, in some examples by multiple sound cards, in some examples by multiple processors, in some examples by software controlled switching techniques, in some examples by multiple translation subsystems, in some examples by multiple translation services, and in some examples by other known means. In some examples spoken translation includes any form of speech, conversation, verbal presentation, voicemail, voice messages, voice commands, one or a plurality of data packets that encapsulate a voice signal, or other types of verbal communications. In some examples text translation includes any form of non-spoken content such as IM (Instant Messaging), chat, e-mail messages, fax (facsimile), SMS, an electronic file (such as an e-mail attachment), and electronic language file (such as for sign language or Braille), or other types of text-based messages and/or non-spoken content. In some examples a translated language(s) includes one or a plurality of Participants utilizing a dialect such as in some examples a non-standard variety of a language that is used by one ethnic or regional group of a language's speakers, in some examples a non-standard variety of a language that is used by a social class within a society, in some examples the heavy use of non-standard words such as slang, or in some examples another type of non-standard variety of a language. In some examples a translated language(s) includes one or a plurality of Participants utilizing a non-spoken language such as in some examples encoded sign language, in some examples Braille, and in some examples another type of non-spoken language.

In some examples said language translation 1540 is performed by known means: In some examples language translation 1540 includes separate translators such as in some examples at least one translator for spoken language, in some examples at least one translator for text language, in some examples at least one translator for dialects, and in some examples at least one translator for non-spoken languages. In some examples language translation 1540 produces translated output in a second language that is derived from speech input in a first language, by means of said speech input signal converted into a digital format with a voice model that includes a content component and a speech pattern component, whereby the content component is translated from the first language into the second language, and an audible output signal is generated that comprises the translated content with an approximation of the speech input signal's speech pattern. In some examples language translation 1540 comprises distributed components that include a real-time translator that has a microphone (or another voice receiver) at a calling device, a converter that converts voice to text, a text-to-text translator that receives the input of a first language and translates it to a selected second language, a converter that converts text to voice for producing audible output of said translation in a second language, and a speaker (or another voice emitter) for playing the voice output at a called device, with said conversion components and translation components distributed so as to effect the translation process. In some examples language translation 1540 may be resident at one or a plurality of host computers, or at one or a plurality of networked data centers, where each language input from a Participant is speech that is processed by speech recognition, translated into one or a plurality of output languages, and said translation is processed by speech generation before each appropriate translated and generated second language speech is transmitted to each appropriate second language-speaking Participant, where it is played or recited by the called device. In some examples language translation 1540 may include components such as speech conversion, language conversion, language translation, transcription, speech generation, language generation, a language translation user interface, and/or one or a plurality of language databases. In some examples language translation 1540 includes speech recognition based on a combination of attributes such as semantics and syntax to map received speech to machine-readable intermediate data that indicates words and/or sounds in a first language (such as English) from a first Participant, whereby said indicated words may be translated into a second language (such as Spanish) for a second Participant that correspond to the sounds and words in the first language, and then generates a translated audio voice signal in the second language that is audibly played for the second Participant in real time (or in near real time). In some examples language translation 1540 receives live speech, converts the speech to text, translates the text into one or a plurality of different languages of the Participants, and then in some examples transfers a translated text to each second language Participant in that Participant's language, or in some examples utilizes said translated text to generate and transmit synthesized speech in each second language Participant's fluent language in such a case either one or both text and/or generated speech may be provided. In some examples language translation 1540 includes recognizing phrases and sentences (rather than only words) in a naturally spoken first language to determine some expressions and/or meanings that are used to determine recognition hypotheses from general language models of the source language; when source expressions are determined they may be translated into similar expressions in a second language so that the speaker's intended meaning(s) may be more accurately provided in the second language translation. In some examples language translation 1540 receives speech signal in a first language from a first Participant, converts it to text, translates that text into a second language, and displays that translated second language as closed captioned text overlaid on the visual image of the first Participant speaking the untranslated speech. In some examples language translation 1540 may use any translation software, system, method, process, service or other known means to effect the required translation(s).

In some examples speech synthesis may correspond to and reflect the vocal and audio characteristics of the respective Participants in a communication. In some examples language translation 1540 may include a known profile of one or a plurality of Participants so that speech synthesis may automatically select an audible voice that reflects each speaking Participant's gender, age, weight, etc. In some examples language translation 1540 may include voice analysis of one or a plurality of Participants so that speech synthesis may automatically select an audible voice that corresponds to the speaker's voice tone and quality, so that said voice selection approximates as best as possible the sound of the voice of each Participant.

In some examples speech synthesis may correspond to and reflect the visual characteristics of the respective Participants in a communication. In some examples language translation 1540 displays and speaks a completed translation in a second language by means of a visual animated display such as an animated character image (that in some examples corresponds to a speaking Participant's age, sex and/or weight; wherein the animated character's mouth moves appropriately when speaking the words and sounds in the second language's translation; in addition, in some examples other facial features may also be animated to display facial characteristics that relate to the speaker's speech pattern such as inflection or tone. In some examples such an animation may accurately reflect at least some of the real first Participant's real facial appearance, real mouth movements, and/or other real facial expressions whereby some of their movements may be correlated when speaking the translation to the inflections that the first Participant used to say specific words or phrases while speaking the source statement in the first language (in other words, a dynamic near real-time animation may include a likeness or appearance of the first speaker).

In some examples language translation 1540 may include a transcription component that produces a saved transcript in one or a plurality of languages, with said saved transcripts archived such that each transcript in each language is searchable, retrievable in whole or in part, downloadable, automatically e-mailed, or otherwise accessible to one or a plurality of Participants, or to others who may be interested in a particular communication; and in addition, said transcription component may be configurable by a user interface or by commands to display the communication's transcript on one or more networked devices while a communication occurs. In some examples said transcription component of language translation 1540 may be available when translation is not utilized such as during a communication that is only between English speaking Participants 1538 1539, and said transcription component may be utilized to produce a saved transcript in the Participants' language, with said saved transcript archived such that it is searchable, retrievable in whole or in part, downloadable, automatically e-mailed, or otherwise accessible to one or a plurality of Participants, or to others who may be interested in a particular communication; and in addition, said transcription component may be configurable by a user interface or by commands to display the communication's transcript on one or more networked devices while a communication occurs.

Figure 52:
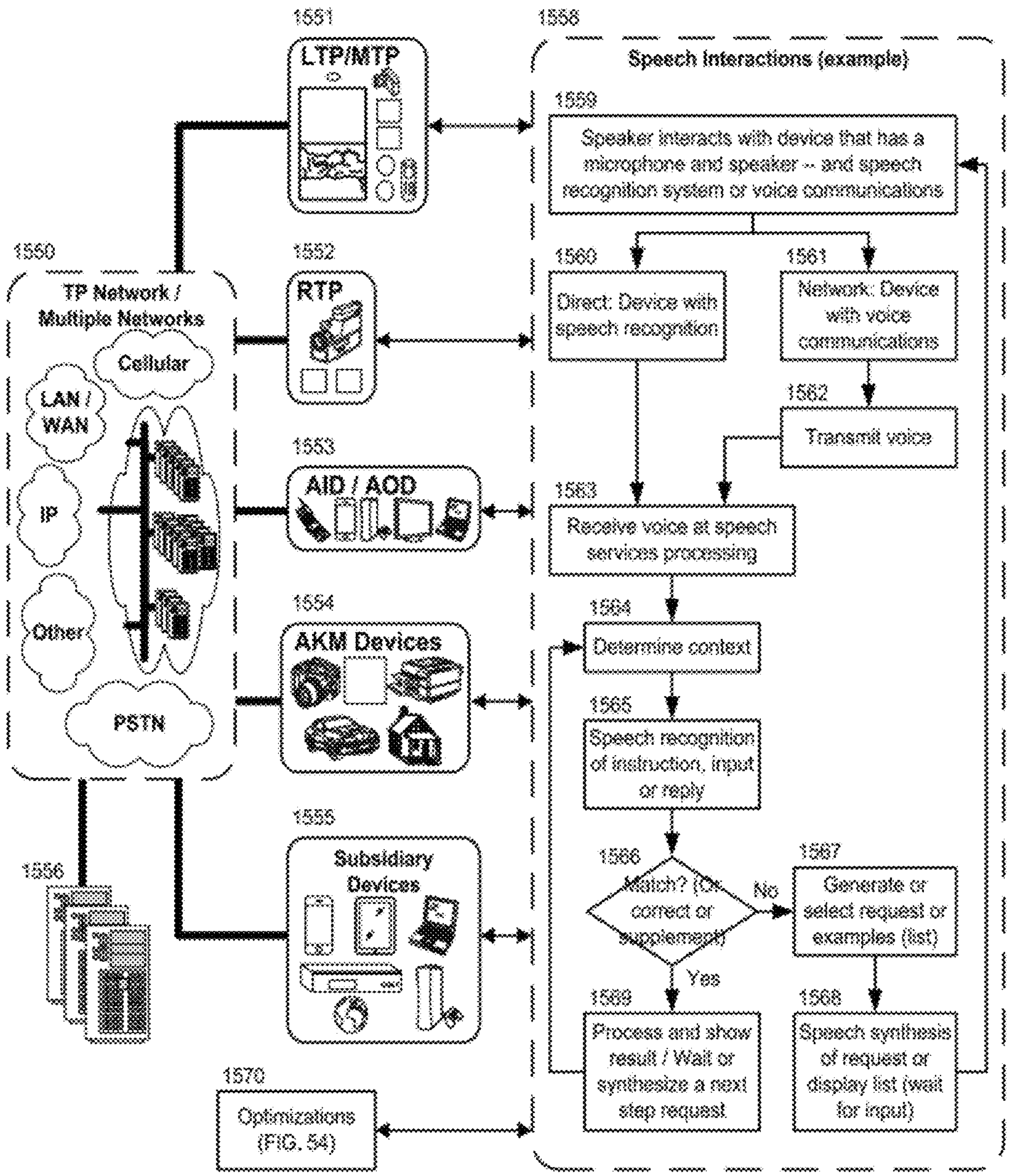
FIG. 52 is a pictorial block diagram that illustrates some examples of speech recognition interactions for control and use.

SPEECH RECOGNITION: FIG. 52, "Speech Recognition Interactions" illustrates speech recognition, which is one of a plurality of ARTPM user I/O capabilities (as described elsewhere), that in some examples converts spoken words to text, in some examples converts spoken words to device instructions or commands, in some examples provide text input, and in some examples includes two-way interactions with a device that employs speech synthesis to produce responses. In some examples an LTP, MTP, RTP, AID/AOD that is running a VTP, a TP subsidiary device run by RCTP, networked systems, or another type of electronic device may include speech recognition. In some examples a device has a microphone, an audio speaker and a speech recognition and speech synthesis system, and in some examples a device has a microphone, an audio speaker and networked communications that can transmit voice data for networked speech recognition and speech synthesis processing. In some examples users start speech recognition by a verbal indication, in some examples by a physical indication means, in some examples by a software indication means, and in some examples by another type of indication. In some examples speech services processing is performed by a speech recognition system in the local device, and in some examples speech services processing is performed by networked speech recognition processing with two-way communications. In some examples a spoken instruction are matched with a speech recognition vocabulary, which in some examples is contextual and appropriate to when a user utilizes a device to perform different types of operations. In some examples speech recognition is performed by one or a plurality of known speech recognition means, methods, processes, or systems. In some examples speech recognition fails; in some examples a speech recognition engine may attempt to determine the cause of the failure and provide audio, visual and/or other means to correct it. In some examples a visual and/or audio indication is provided by one or a plurality of means that speech recognition succeeded. In some examples after speech recognition succeeds a recognized instruction(s) is matched with the corresponding device command(s) which are utilized to perform the instruction(s) and show the result. In effect, device performance is directed by spoken interactions with any needed corrective actions, indications of success and the results produced.

Figure 53:
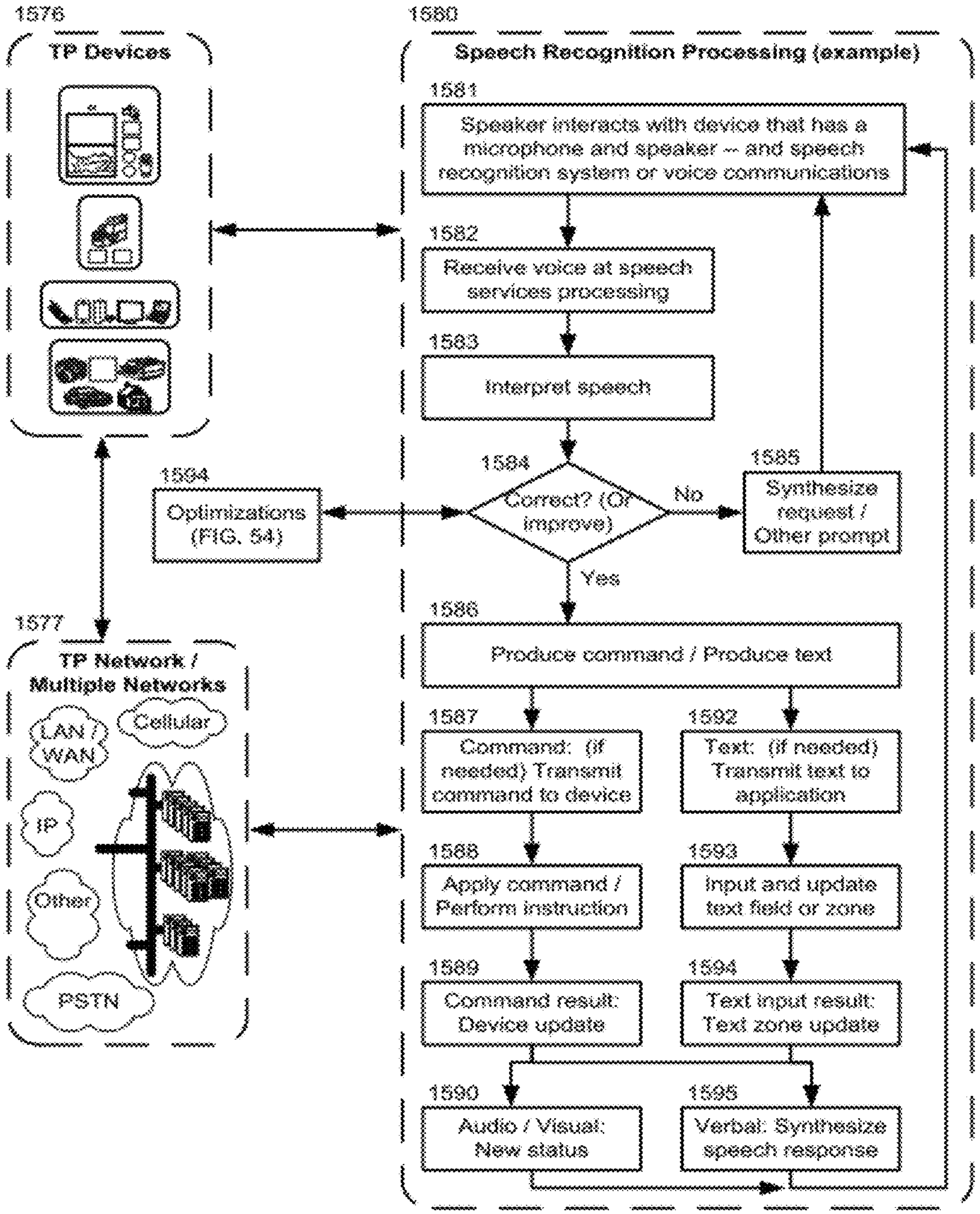
FIG. 53 is a pictorial block diagram that illustrates some examples of speech recognition processing that may be performed locally and/or remotely.

FIG. 53, "Speech Recognition Processing," illustrates some examples where speech recognition processing 1582 1583 is performed as described above, including corrective actions if it fails. In some examples after speech recognition of a user's instruction(s) succeeds the recognized instruction (s) is matched with the appropriate device command(s), which perform the task or instruction. In some examples the result of the user's verbal instruction are confirmed verbally, visually or by other means such that the effect of the user's spoken direction(s) are clearly indicated so the user knows the device has performed the proper and correct action(s). In some examples a user may choose to use speech entry of dictated text to perform text entry such to verbally enter words and numbers in fields, to enter text in a memo or e-mail, or to enter text for another purpose. In some examples the result of spoken text entry is indicated clearly such as by displayed text, by synthesized speech, or by other means so the user knows the device has performed the proper and correct action (s). In some examples different speech recognition processing may provide different types of speech recognition such as local device speech recognition may match user instructions against a controlled vocabulary that is locally stored, while networked speech services provide text entry that provides recognition by means of a large vocabulary whose breadth includes both an entire language and multiple languages.

Figure 54:
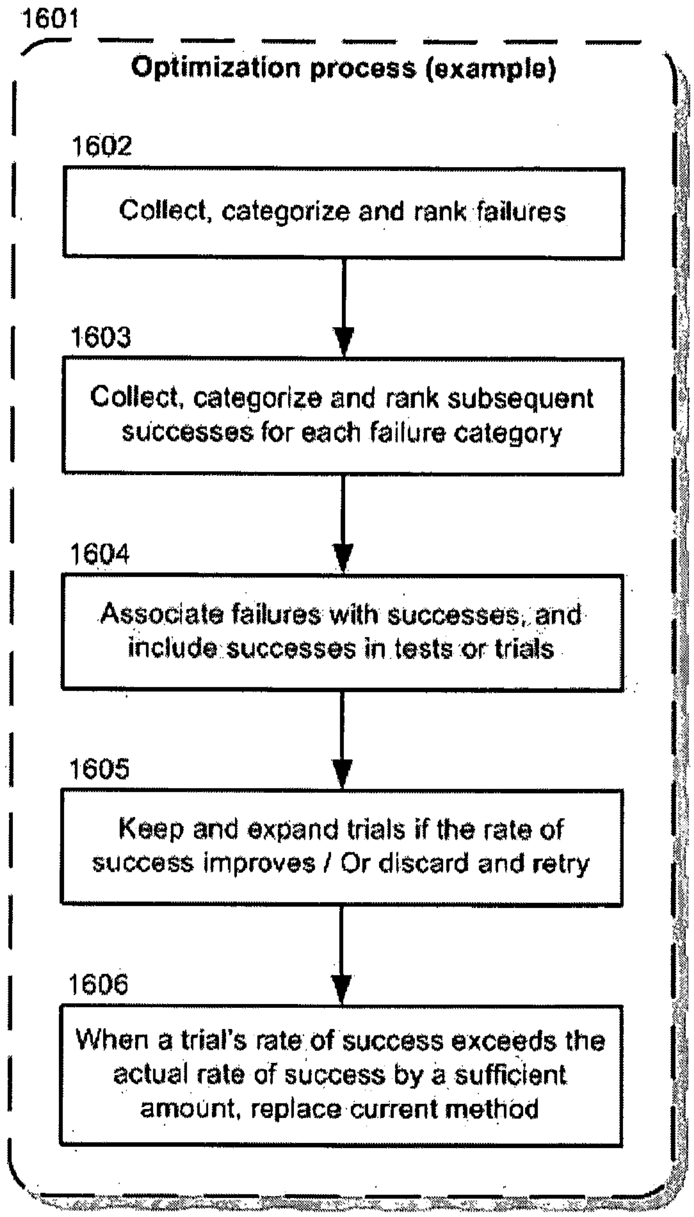
FIG. 54 is a flow chart showing some examples of procedures for optimization of speech recognition.

FIG. 54, "Speech Recognition Optimizations," illustrates some examples of optimizations (which are described elsewhere in more detail) including both automated optimization means and manual optimization means. In some examples speech interactions may be optimized by collecting and recording failed attempts; by categorizing failures into groups (such as by content analysis or other means), and by ranking categories of failures such as by each category's rate of failure. In some examples optimization proceeds by identifying failures and subsequent successes, collecting and recording said successes, and associating successes with categories of failures to create parallel categories of recorded successes, then ranking successes by each's rate of success. In some examples specific types of successes may be tested by automated means and/or by manual means to determine which produce a higher rate of user success, and to adapt the speech recognition system to employ those and produce a higher rate of user success.

Speech recognition provides benefits such as in some examples enabling hands-free device control and device interactions while engaged in other activities; in some examples a simplified and consistent command vocabulary that can be distributed to multiple devices for ease-of-use when utilizing a new device; in some examples the ability for some devices to respond such as in some examples by validating a command before executing it, in some examples to use voice interaction to obtain supplementary data or correct insufficient data, in some examples to display or verbalize an expanded task-specific vocabulary of local commands when a user performs a specific type of task, and in some examples perform other types of verbal operations that expand ease-of-use, accessible functions, etc.

Turning now to FIG. 52, "Speech Recognition Interactions," some examples are illustrated in which there is automated speech recognition and automated speech synthesis that in some examples provide at least some verbal control of a device, in some examples provide text input where text is utilized, and in some examples provide other uses (collectively referred to herein as "speech recognition"). In some examples an LTP 1551 may include speech recognition 1558; in some examples an MTP 1551 may include speech recognition 1558; in some examples an RTP 1552 may include speech recognition 1558; in some examples an AID/AOD that is running a VTP 1553 may include speech recognition 1558; in some examples a TP subsidiary device 1554 (as described elsewhere) that is running RCTP may include speech recognition 1558; in some examples one or a plurality of networked systems 1556 (such as in some examples a server 1556, in some examples an application 1556, in some examples a database 1556; in some examples a service 1556, in some examples a module within an application that utilizes an API to access a server or service 1556, or in some examples another network means 1556); in some examples another type of electronic device such as in some examples an AKM device 1554 (as described elsewhere) may include speech recognition 1558; in some examples another type of networked electronic device 1554 may include speech recognition 1558, or in some examples speech recognition may be provided for a networked electronic device 1554 (such as in some examples an AKM device 1554) by a network subsystem 1556, a network service 1556, or by other remote means over a network 1556 such as an application, a speech recognition server, etc.

In some examples speech recognition 1558 may take the form of an entirely hardware embodiment that is located in one or a plurality of locations and provided by one or a plurality of vendors, in some examples an entirely software embodiment that is located in one or a plurality of locations and provided by one or a plurality of vendors, or in some examples a combination of hardware and software that is located in one or a plurality of locations and provided by one or a plurality of vendors. In some examples speech recognition 1558 may take the form of a computer program product (e.g., an unmodifiable or customizable computer software product) on a computer-readable storage medium; and in some examples speech recognition may take the form of a web-implemented software product, module, component, and/or service (including a Web service accessible by means of an API for utilization by other applications and/or services, such as in some examples communication services). In some examples said devices, hardware, software, systems, services, applications, etc. 1558 are connected by one or a plurality of disparate networks 1550; in some examples parts of said speech recognition 1558 may be distributed such that various functions are located in local and/or remote devices, storage, and media so that various steps are performed separately and link through said network(s) 1550; in some examples the equivalent of said speech recognition 1558 may be provided by means other than exemplified herein and provided over said network(s) 1550.

In some examples speech recognition 1558 begins when a speaker interacts verbally with a device that has a microphone, an audio speaker and a speech recognition system 1559; and in some examples speech recognition 1558 begins when a speaker interacts verbally with a device that has a microphone, an audio speaker and networked communications that can transmit voice data 1559 1562 for networked speech recognition processing. In some examples to start speech recognition a user speaks an appropriate command word that initiates speech recognition followed by a task instruction, such as in some examples "(device name) (command) (object)" such as "Teleportal focus the connection with Jane," which in some examples instructs a device (a Teleportal) to perform an action (from a currently open SPLS, focus the current live connection with the SPLS member named Jane). In some examples a command word is not needed and instead one or a plurality of speech recognition indications are provided such as in some examples by using a pointing device to highlight an indicator such as a speech recognition icon, in some examples by a gesture, in some examples by a predefined type of touch on a screen or icon or button, in some examples by a predefined button or touch on a remote control, in some examples by a predefined physical indicator such as by means of a user I/O device, in some examples by means of a predefined software indicator such as a user interface element, and in some examples by another indication means.

In some examples speech services processing 1563 1564 1565 is performed by a speech recognition system in the local device 1560; and in some examples speech services processing 1563 1564 1565 is performed by networked speech recognition processing with two-way voice communications 1561 1562. In some examples a spoken command word and instruction are matched with a speech recognition vocabulary which in some examples is stored in a local device 1560 1563, in some examples is stored by networked speech recognition processing 1561 1562 1563, and in some examples is stored by a combination of a local device 1560 1563 (for a shorter response time) and networked speech recognition processing 1561 1562 1563 (for a broader range of speech recognition capabilities, algorithms and vocabularies).

In some examples to increase recognition accuracy and speed, speech services processing 1563 is contextual 1564 such as when a user utilizes a device to perform different types of operations. In some examples based on a setting or use of an element in the user interface, the selection of an operation causes the display of a set of contextually appropriate commands 1564 and instructions 1564 in a proximate location to the portion of a display where that selected operation is located; and in some examples said list of contextually appropriate commands 1564 and instructions 1564 dynamically adapts to the user's words while issuing a command so that both valid and likely speech recognition instructions options are presented at all times. In one illustration of one type of operation such as a focused communication 1564, certain commands are more likely and may be displayed for verbal use and more accurate recognition 1565 such as in some examples "Teleportal increase volume," "Teleportal change background to [say location, like 'the Lincoln Memorial in Washington, D.C.']," "Teleportal start recording," "Teleportal end focused connection," etc.). In a second illustration of a second type of operation such as constructing a digital reality 1564, different commands are more likely and may be dynamically adapted to the current stage of a task for greater relevance and recognition 1565 such as in some examples "Teleportal display RTP views of Times Square," "Teleportal select aerial view 4," "Teleportal change all advertising displays [name a product such as Coca-Cola or a person such as your sister]," "Teleportal broadcast this digital reality with the name 'It's Jane's day in Times Square']," etc.). In a third illustration of a third type of operation such as editing a boundary Paywall 1564, different commands are more likely and may be dynamically displayed based upon previous types of Paywall edits which that user has performed for greater personalization and recognition 1565 such as in some examples "Teleportal list brands blocked from this identity's digital realities," "Teleportal add Kellogg's to the list of blocked brands," "Teleportal respond to Kellogg's ads and product images with my usual Paywall payment offer," etc.). In a fourth illustration a Context Free Grammar (herein CFG) may be employed to limit the vocabulary and syntax to a narrow set that fits numerous application states such as start, stop, focus, end focus, record, stop recording, add background, change background, remove background, etc.

In some examples after each command and instruction speech recognition is performed 1565 by matching the instruction against that context 1564 and that context's vocabulary 1564; in some examples by matching each instruction against a controlled vocabulary 1565 (including "fuzzy" matching in some examples); in some examples by transforming digital audio into an acoustic representation, extracting phonemes, applying a "grammar" to determine which phonemes were spoken, and to convert phonemes into words 1565; in some examples by using a hidden Markov model 1565; in some examples by permitting continuous dictation in certain instances such as to transcribe text input into a field or a text zone 1565; in some examples by permitting the recognition of continuous speech under any and all conditions 1565; and in some examples by utilizing another process by which a device and/or local or remote system utilize speech as a means of issuing commands, entering data input, or converting speech to text 1565.

In some examples a visual or audio indication is provided that recognition succeeded 1566 which in some examples may be by performing the instruction 1569, visibly showing the result 1569 and awaiting the next instruction 1569; in some examples an indication may be showing a success icon or image known to the local culture such as a green check mark 1569; in some examples an indication may be synthesizing and "voicing" a verbal reply such as "Done. Say undo, or what to do next" 1569; in some examples by highlighting the instruction that was just performed such as a background that was replaced 1569; in some examples by another type of indication 1569; and in some examples by a combination of two or more types of indications 1569 such as in some examples showing the result, highlighting it and displaying a green check mark next to it 1569.

In some examples speech recognition fails 1566 such as in some examples because the speaker's word(s), language or accent were not understood 1566; in some examples a controlled vocabulary did not include the speaker's words 1566; or for another reason that an instance of speech recognition might fail 1566. At the occurrence of a failure 1566 this speech recognition engine attempts to determine the cause of the failure 1567 and in some examples select a clarifying request 1567 or question 1567; in some examples generate a clarifying question or request 1567; in some examples select a short list of the most likely valid instructions 1567; or in some examples utilize a different type of prompt or corrective action. Said request 1567 or question 1567 is synthesized as speech 1568 and transmitted as a response to be played by the audio speaker(s) of the user's device 1559, so that the user may attempt to respond appropriately 1559 and speech services processing 1563 may re-attempt speech recognition 1565 of said user's reply. Alternatively, the list of the speech engine's best guess of valid instructions 1567 may be transmitted 1568 and displayed 1559 for the user to select and say one of the instructions 1559, or for the user to construct a different instruction that resembles the examples displayed 1559, and speech services processing 1563 may re-attempt speech recognition 1565 of said user's reply. Alternatively, in some examples optimizations 1570 may (optionally) be performed as described in FIG. 54.

In some examples after speech recognition succeeds 1565 1566 the recognized instruction(s) 1566 is matched with the appropriate device command(s) 1569 and are utilized to perform the instruction 1569 and show the result 1569. In effect, device performance 1569 is directed by spoken interactions 1559 with repeated indications of success 1569 and the results produced 1569 when speech succeeds, and recovery actions 1567 1568 when it fails. In addition, in some examples clear and visible guidance such as contextually valid and appropriate instructions may be displayed as a default setting or as a recovery action at any time guidance is desired or helpful. In some examples visible, appropriate and sequenced speech instructions guidance may be set to display whenever a user starts an unfamiliar task such as in some examples constructing a new digital reality, in some examples setting one or a plurality of boundaries that control what is included and what is it excluded from an identity's digital realities, in some examples copying an entire set of personal boundaries that have been proven to produce high revenues for their users, or in some examples starting another type of unfamiliar task. In some examples these sequenced speech instructions may be downloaded to a device as needed from an AKM (as described elsewhere) when a user starts an unfamiliar task. Therefore, in some examples a device such as a Teleportal may offer a wide range of capabilities to a novice user, but simultaneously provide means to enable potential performance success when attempting a new task for the first time.

Turning now to FIG. 53, "Speech Recognition Processing," some examples are illustrated of processing speech recognition 1580. In some examples as described elsewhere one or a plurality of TP devices 1576 may include speech recognition such as in some examples an LTP 1576, in some examples an MTP 1576, in some examples an RTP 1576, in some examples an AID/AOD that is running a VTP 1576, in some examples a TP subsidiary device 1576 (as described elsewhere) that is running RCTP, in some examples one or a plurality of networked systems 1576 1577 (as described elsewhere); in some examples another type of electronic device such as in some examples an AKM device 1576 (as described elsewhere), in some examples another type of networked electronic device 1576, or in some examples another type of networked electronic device 1576 (such as in some examples an AKM device 1576) by a network subsystem 1576 1577, a network service 1576 1577, or by other remote means over a network 1576 1577 such as an application, a speech recognition server, etc.

In some examples speech recognition processing 1581 begins when a speaker interacts verbally with a device that has a microphone, an audio speaker and a speech recognition system 1581; and in some examples speech recognition 1581 begins when a speaker interacts verbally with a device that has a microphone, an audio speaker and networked communications that can transmit voice data (as described elsewhere) for remotely located, networked speech processing.

In some examples speech services processing 1582 1583 is performed as described elsewhere (such as in some examples by a speech recognition system in the local device 1582; and in some examples speech services processing is performed by networked speech recognition processing 1582 with two-way voice communications; in some examples by a spoken command word and instruction that are matched with a speech recognition vocabulary 1583; in some examples to speech services processing 1583 is contextual; in some examples speech services processing 1583 is performed by another speech recognition means as described elsewhere). In some examples speech recognition fails 1584 (as described elsewhere) and in some examples at the occurrence of said failure the speech recognition engine attempts to determine the cause of the failure and obtain clarification 1584 1585 1581 (such as in some examples by means of voice synthesis 1585 1581, in some examples by other types of prompts 1585 1581) so a user may attempt to respond appropriately 1581 and speech services processing 1583 may re-attempt recognition 1565 of said user's new reply. Alternatively, in some examples optimizations 1594 may (optionally) be performed as described in FIG. 54.

In some examples after speech recognition of a user's instruction(s) succeeds 1583 1584 the recognized instruction (s) is matched with the appropriate device command(s) 1586 1587 which are transmitted to the device (such as locally 1587 in some examples between a device's speech engine component and device processing, such as remotely 1587 in some examples between networked speech services and device processing, and such as a combination 1587 in some examples between networked speech services that provide speech recognition and device processing that matches the remotely recognized instruction[s] with the corresponding device command[s]); and are utilized to perform the user-directed task or instruction 1588. In some examples the result 1589 1590 1581 of the user's verbal instruction is displayed clearly 1589 1590 1581, in some examples the actions are confirmed verbally by synthesized speech 1590 1581, and in some examples the result 1589 1590 1581 is indicated by one or a plurality of other means (as described elsewhere) such that the effect of the user's spoken direction(s) are clearly indicated so the user knows the device has performed the proper and correct action(s) 1590 1581.

In some examples a user may choose to use speech entry of text 1581 when performing contextually appropriate text entry during a task such as in some examples to verbally enter words and numbers in a field 1581, in some examples to verbally enter a text message in a form 1581, in some examples to verbally enter text in a memo 1581 or an e-mail 1581, and in some examples to verbally enter text for another purpose 1581. In some examples speech recognition of text proceeds in the same manner 1581 1582 1583 1584 1585 with any remote networked speech recognition transmitted 1592, and local speech recognition displayed locally, until the text is produced successfully 1586 1592 and the appropriate text entry field or zone is entered 1593 and visible 1594. In some examples the result 1593 1594 of the user's verbal text dictation is displayed clearly 1593 1594 1581, in some examples the actions are confirmed verbally by synthesized speech 1595 1581, and in some examples the result 1593 1594 1595 1581 is indicated by one or a plurality of other means (as described elsewhere) such that the effect of the user's verbal entry of text is clearly indicated so the user knows the device has performed the proper and correct action(s) 1594 1595 1581.

In some examples different speech services 1582 1583 may be employed to provide different types of speech recognition such as in some examples local device speech services 1582 may match user instructions against a controlled vocabulary that is locally stored 1583, and in some examples networked speech services 1582 may provide an alternate speech recognition processing for text entry in which a user's verbal entries are matched against a large vocabulary 1583 whose breadth of speech recognition capabilities may scale to both an entire language and to multiple languages, serving one or a plurality of users 1581 in one or a plurality of locations.

Turning now to FIG. 54, "Speech Recognition Optimizations," some examples are illustrated of speech interactions that in some examples may be optimized by automated means 1601 and in some examples by manual means 1601 (with various optimizations means described elsewhere in more detail but called out to illustrate some additional optimizations examples). In some examples speech interactions may be optimized by collecting and recording failed attempts 1602; in some examples by categorizing collected and recorded failures into groups 1602 (such as in some examples by content analysis software or system 1602, in some examples by the users' choices of speech or wording 1565 1602, in some examples by their context of use 1564 1602, in some examples by the application and application stage 1564 1602, in some examples by a task such as adding a digital event to an online resource such as to a PlanetCentral or a GoPort 1564 1602 [as described elsewhere], and in some examples by other categorization means 1602); and in some examples by ranking collected and recorded grouped categories of failures 1602 by each category's rate of success and rate of failure.

In some examples optimization 1601 proceeds by identifying failures 1602 then identifying when a subsequent success occurs and collecting and recording said successes 1603; in some examples by associating successes with collected categories of failures 1603 to create parallel categories of recorded successes 1603; in some examples by sub-grouping the successes within each category 1603 (such as in some examples by content analysis software or system 1603, in some examples by the users' choices of instruction wording 1603, and in some examples by other categorization means 1603); and in some examples by ranking collected and recorded group successes 1603 by each's rate of success and rate of failure.

In some examples specific failures 1602 may be associated with specific successes 1603 and the means employed in those successes to interactively turn failures into successes (such as in some examples as part of its speech recognition interface 1559 1581; in some examples as part of interacting with a user by means of speech I/O 1559 1567 1568; in some examples generating and transmitting a correction request 1567 1568, in some examples generating and transmitting example interactions 1567 1568, in some examples displaying a list of example corrections 1567 1568, and in some examples generating and delivering other types of corrective actions or suggestions 1567 1568); and in some examples means that turned failures into successes 1604 may be tested 1604 (such as in some examples by automated means as described elsewhere, and in some examples by manual means).

In some examples the result of certain tests 1604 is a declining rate of user success 1605 (which in some examples may be measured and/or reported as an increased rate of user failure 1605), and said means are discarded rather than utilized to improve user success 1606. In some examples the result of certain tests 1604 is to deliver a higher rate of user success 1605 and said tested means to improve user success may subsequently be delivered to users in some examples as part of a speech recognition interaction system 1606 1558 1580 (such as in some examples when providing a speech recognition interface 1559 1581; in some examples in the steps or process[es] utilized to interact with a user by means of speech I/O 1559 1567 1568; in some examples when generating and transmitting a correction request 1567 1568, in some examples when generating and transmitting example interactions 1567 1568, in some examples when displaying a list of example corrections 1567 1568, and in some examples when generating and delivering other types of prompts, suggestions, corrective actions, etc. 1559 1567 1568 1569); and in some examples as part of an additional system that raises speech recognition success rates (such as AK as part of an AKM which may improve user success as well as provide additional optimizations, as described elsewhere).

RCTP (REMOTE CONTROL TELEPORTALING): Productivity means doing more with fewer resources. Efficiency means producing more with fewer steps and at lower costs. Effectiveness means reaching goals in faster and better ways. Happiness means eliminating problems while spending more time doing what we want. Wealth means earning more and being able to do more while spending less.

Today we live in a blizzard of new and complex networked electronic devices that increasingly require us to figure out and use new combinations of hardware, software, networks, communications, services, data, entertainment, etc. Some of these are illustrated in the subsidiary devices zone 2226 2227 in FIG. 55, "RCTP—Subsidiary Devices (SD) Summary." In a brief summary of some examples, some of these SD's 2227 include mobile phones 2228, wearable electronic devices 2228, PCs 2229, laptops 2229, netbooks 2229, tablets 2229, electronic pads 2229, video games 2229, servers 2229, digital televisions 2230, set-top boxes 2230, DVR's (digital video recorders) 2230, television rebroadcasters 2230, surveillance cameras 2231, sensors 2231, Web services 2232, and RTPs (Remote Teleportals) 2233. Increasingly, a single task can become multi-faceted if it includes picking up or starting one of these SD's (like a a tablet, pad or smart phone); turning it on and connecting it to a network (like the Internet or a mobile phone service); running an application that uses a remote service (like search, an electronic reader, a social media application for a service like Facebook, voice-recognition texting, etc.); then accessing remote and/or local data to perform a task that includes a different remote service (like taking a photograph with the device, cropping it with a picture editor on the device, using a messaging application to write a text message or a social media update, attaching the cropped photo and sending it).

SD's 2227 run different operating systems, use different interfaces, access the Internet over different services, and employ different means for communications and for other digital tasks. Superficially, they seem to be many different types of devices but when factored down they are basically digital means to work with words, pictures, video, music, entertainment, communications and data—they provide many of the same features even though they have different physical appearances, software interface designs, protocols, networks, applications, etc. Factoring their differences shows that they have many similar features that include find, open, display, scroll, select, highlight, link, navigate, use, edit, save, record, play, stop, fast forward, fast reverse, go to start or end, display menu, lookup, contact, connect, communicate, attach, transmit, disconnect, copy, combine, distribute, redistribute, broadcast, charge, bill, make payments, accept payments, etc.

Is it possible to tame this blizzard of overlapping features, devices and their remote services in ways that make us more productive because we can do more with fewer resources? In ways that make us more efficient because we can produce more with fewer steps and at lower costs? In ways that make us more effective because we can reach goals in faster and better ways? In ways that make us happier because we can eliminate the problems from needing to buy, learn and use too many different devices and different complicated interfaces, so that we can spend more time on what we want? In ways that make customers wealthier because we can do more and earn more from what we do, while spending less on unnecessary devices and services? Remote Control Teleportaling (herein RCTP) provides means to turn some types of electronic devices into SD's (subsidiary devices) that can be run in some examples with a common, familiar interface from devices such as LTP's (Local Teleportals) and MTP's (Mobile Teleportals); and in some examples with a remote control interface that resembles each SD's interface; and in some examples with a different remote control interface.

In some examples it is therefore possible to turn a plurality of types of networked electronic devices into SD's that can be run in some examples by RCTP either as an SD's owner, and/or without needing to buy those SD's, their applications, their digital content, or pay for the services to which they subscribe. That latter option may be provided by SD Servers which in some examples are servers, in some examples are services, in some examples are applications, in some examples are provided by third-parties, in some examples are provided by API's, in some examples are provided by modules, in some examples are provided by widgets, and in some examples are provided by other means.

If this is possible it could affect industries 2226 such as devices, applications, content and services, which are larger than just the devices that some vendors sell. In some examples the affected industries include mobile phones 2226, in some examples computers 2226, in some examples tablets 2226, in some examples servers 2226, in some examples televisions 2226, in some examples DVR's 2226, in some examples surveillance 2226, in some examples various types of sensors 2226, and in some examples other types of networked electronic devices and/or devices with networked electronic controllers. The affected industries 2226 could also include the vendors of in some examples device operating systems 2226, in some examples software applications 2226, in some examples office software 2226, in some examples creative applications for creating or editing content 2226, and in some examples modules or services for providing these applications through these devices 2226. The affected industries could also include the vendors of digital content such as in some examples music 2226, in some examples movies 2226, in some examples television shows 2226, in some examples books 2226, in some examples expensive college textbooks 2226, in some examples digital magazines 2226, in some examples news 2226, in some examples other types of digital content 2226. The affected industries could also include some network-based industries 2226 that provide bandwidth such as in some examples mobile phone services 2226, in some examples cable or satellite television services 2226, in some examples other types of specialized connectivity 2226. In addition, it could also affect the remote services industries 2226 that customers use with SD's such as in some examples videoconferencing services 2226, in some examples subscription-only documents 2226 such as journals, in some examples restricted databases 2226 such as purchased by research libraries and available only to authorized patrons, and in some examples other types of remote services 2226. In some examples the affected industries could also include other industries that sell other types of products, equipment, applications, software, content, services and more to owners of SD's.

From an economic history view, it is possible to draw a parallel between RCTP and unbundling compound products. In one example the music industry used to sell single songs for a single song price, but over time managed to evolve the product to selling entire albums for $10 to $16 each—but when digital technology recently re-enabled the selling and buying of single songs, the customer's average music purchase dropped from an album to a song and the industry lost a major portion of its revenues. Similarly, newspapers and magazines never wanted to sell individual articles for pennies so packaged their products to selling a whole magazine or a whole newspaper with multiple editorial components, and even further evolved the product packaging to locking customers into subscribing to multiple issues—yet again, when digital technology enabled clicking to only the individual article that a customer wants to read, instead of a buying a whole publication customers stopped subscribing, and many stopped paying for most editorial content. In another example cable TV bundles television into a dual stream of forcing subscribers to buy numerous channels (availability of 500 channels times 24 hours a day of programming) plus charges to advertisers (running ads across 500 channels times 24 hours a day of programming) for access to those subscribers—but digital DVRs and Internet television shows make it possible for customers to view or buy only the few shows they actually watch with almost no advertisements, which has started unbundling cable TV. In some examples RCTP might be viewed as a similar digital unbundling, wherein each customer no longer needs to buy their own entire networked electronic device with its required software, copies of digital content and specialized services, just to receive the functions they occasionally want, but can instead click to just what they need when they need it—which in some examples might simultaneously unbundle a plurality of hardware, software, content, services and other industries.

In some examples RCTP could help simplify the range of SD's—with fewer devices that need to be bought, fewer interfaces that need to be figured out and learned, less content that needs to be bought and owned by each individual, and fewer network services that need to be paid to be used. Potentially, one or a plurality of customers and users could be more productive, more efficient, more effective, happier and wealthier—doing more and receiving more, while spending less. Potentially, this would also be different for the affected industries' 2226 manufacturers and vendors because RCTP access and use of one or a plurality of types of electronic devices might alter the number of device manufacturers, software developers, network services vendors, remote services vendors, and application creators—as well as alter the operations and focus of each industry's leading vendors—because what they sell and how it is used could be more accessible to a wider range of customers, in some examples because each user would no longer need to purchase or personally own as many devices, applications, content and services. As a result, one or a plurality of those devices, vendors or industries might be turned into a more of a service in some examples, a commodity in some examples, a smaller industry in some examples, a large vendor of generic functions in some examples, a successful niche vendor of a superior branded function in some examples, a leader in one or a plurality of categories that has a large customer base through digital access in some examples, or have other material and operating consequences.

In the end, is it possible to turn today's hailstorm of complex electronic devices into "subsidiary devices" (herein SD), and enter a "Post Subsidiary Device Stage" (herein "Post SD Stage") of electronic device development? When printing and publishing began, it took about 75 years to develop the modern book (from about 1445 to 1520) during which time the printed book evolved from a few expensive copies of hand-rendered calligraphy into its now familiar standard components, order and layouts that became more affordable by a wider range of readers. Might RCTP help advance a similar evolution of digital devices today, wherein some digital devices and functions are rationalized into a smaller number of consistent usage designs and predictable processes within an accessible digital environment that is more affordable for wider use with greater benefits to more people? If so, that would be an Alternate Reality indeed—a Post SD Stage whose evolution is envisioned and described by the ARTPM.

Additionally, in some examples RCTP systems, methods, apparatuses and processes for remote control can be embodied in specific systems that each provide a range of focused benefits; such as in some examples an SD server(s), in some examples a help desk for various types of electronic devices (such as subsidiary devices enumerated elsewhere), in some examples customer support that includes hands-on use of a device or system being supported, in some examples an education or teaching system that utilizes a plurality of SD's under individual remote control or simultaneous remote control, in some examples technical support for complex equipment or complex devices, in some examples for services such as telecommunications, vehicle operations, equipment operations, etc.

RCTP—Subsidiary Devices Summary: Currently, large numbers of people have become buyers and users of electronic devices such as computers 2229, laptops 2229, netbooks 2229, tablets 2229, video games 2229, mobile phones 2228, televisions 2230, television set-top boxes 2230, digital video recorders 2230, network services 2232, Web services 2230, remote services 2230, etc.—not to mention the numerous types of software, digital content and services that run on them, or provide connectivity or content to them. As these have become increasingly ubiquitous and popular users have the growing problem of too many devices and too many expenses for using similar features and performing similar tasks in the many different ways sold by what gradually become competing industries. Here, this RCTP advance provides means for remote control that enables a user to gain remote control over one or a plurality of electronic devices, and thereby turn them into subsidiary devices—perhaps reducing the dependence on any one of those industries, devices, services, applications, etc.

Figure 55A:
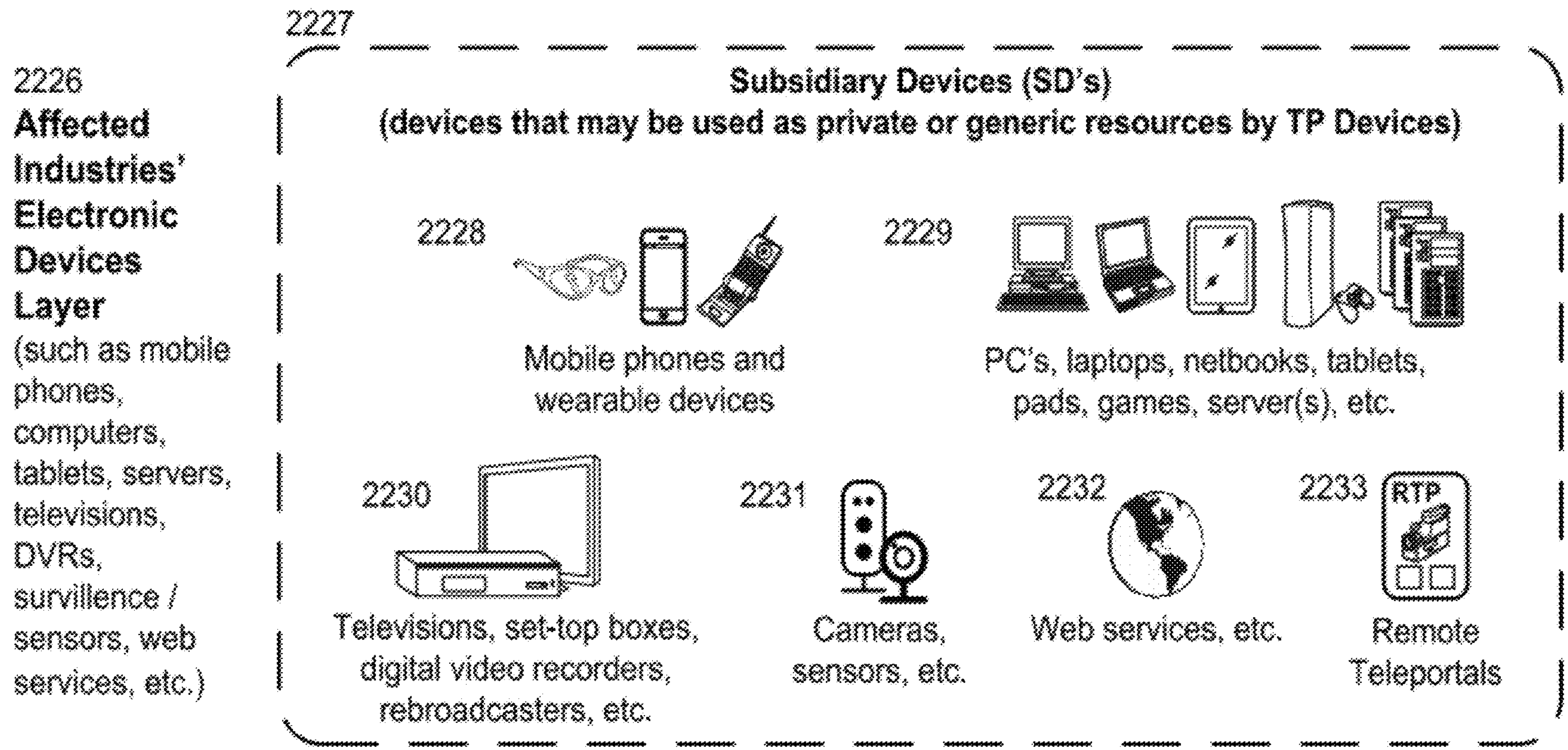
FIG. 55 is a pictorial block diagram that illustrates some examples of an overall architecture summary of subsidiary devices including some examples of subsidiary devices, device components, and devices data.
Figure 55B:
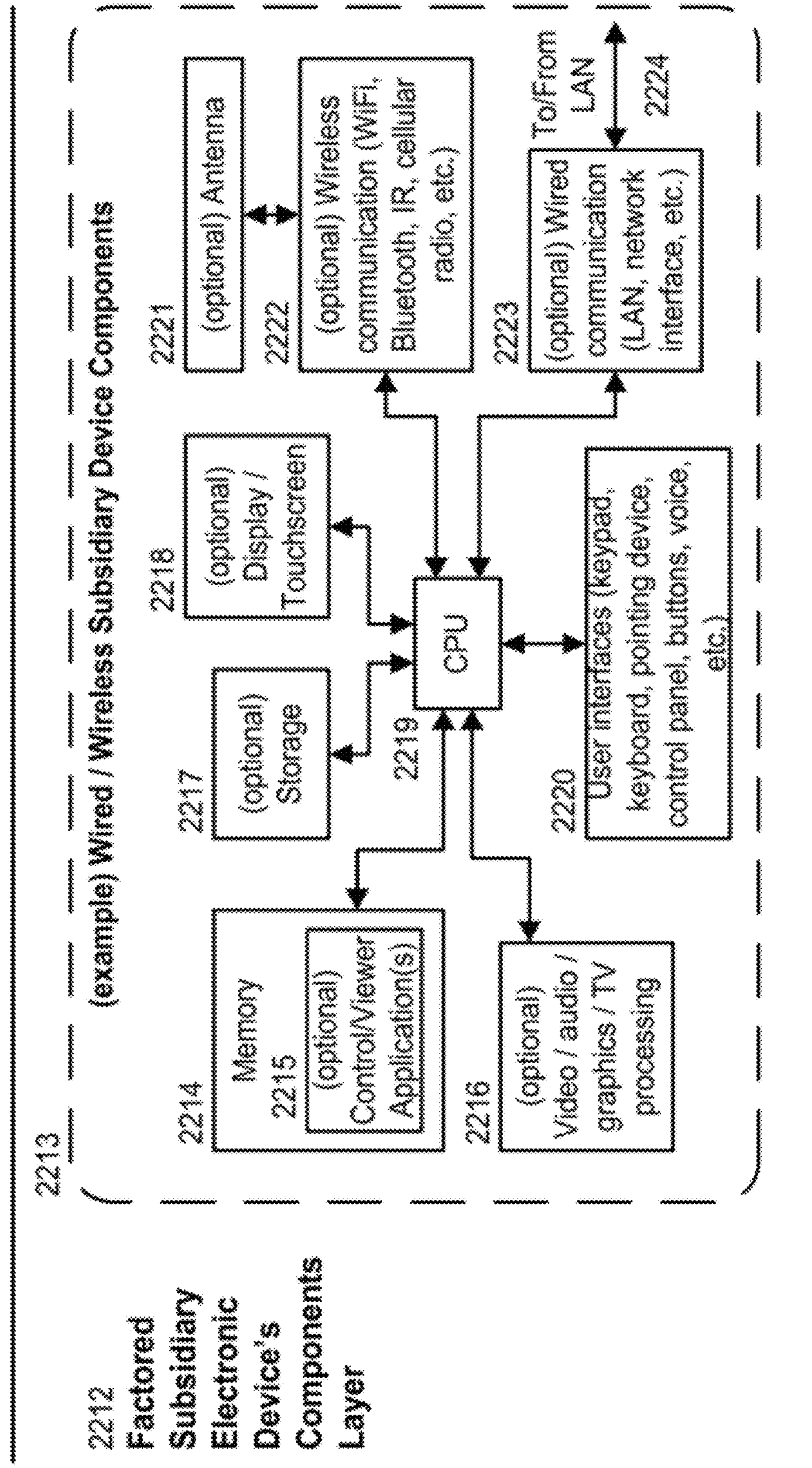

FIG. 55, "RCTP—Subsidiary Devices Summary": In some examples one or a plurality of devices (with some examples at bottom) that may be controlled by RCTP. In some examples one or a plurality of SD's include similar components (with some examples in the middle). In some examples the data and/or applications required to connect to one or a plurality of SD's may be stored in one or a plurality of means (with some examples illustrated at top), with each record corresponding to a subsidiary device. In some examples one or a plurality of a user's personally owned SD's are accessible by that person; in some examples SD's that may be owned by a plurality of individual owners and/or third-parties are registered with and/or accessible by one or a plurality of SD servers.

Figure 56:
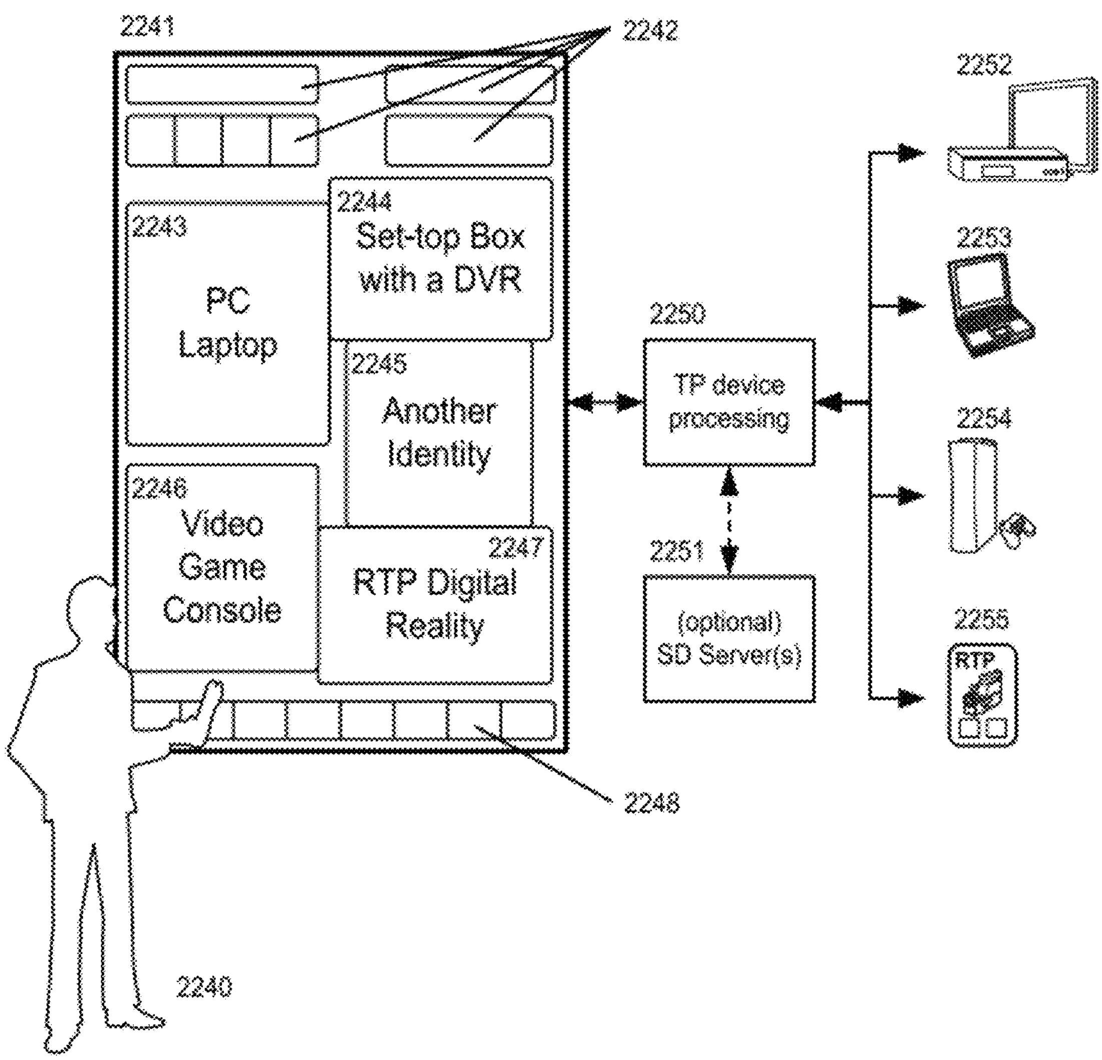
FIG. 56 is a pictorial diagram showing some examples of one identity simultaneously utilizing a plurality of subsidiary devices.

FIG. 56, "RCTP—Plurality of Simultaneous Subsidiary Devices": In some examples a single user with a single Controlling Device (herein CD) may simultaneously access and remotely control a plurality of SD's, such as in some examples a computer, in some examples a cable television set-top box, in some examples a video game, in some examples an RTP, etc. Optionally, in some examples said identity may access and use one or a plurality of SD's by means of an SD server.

Figure 57:
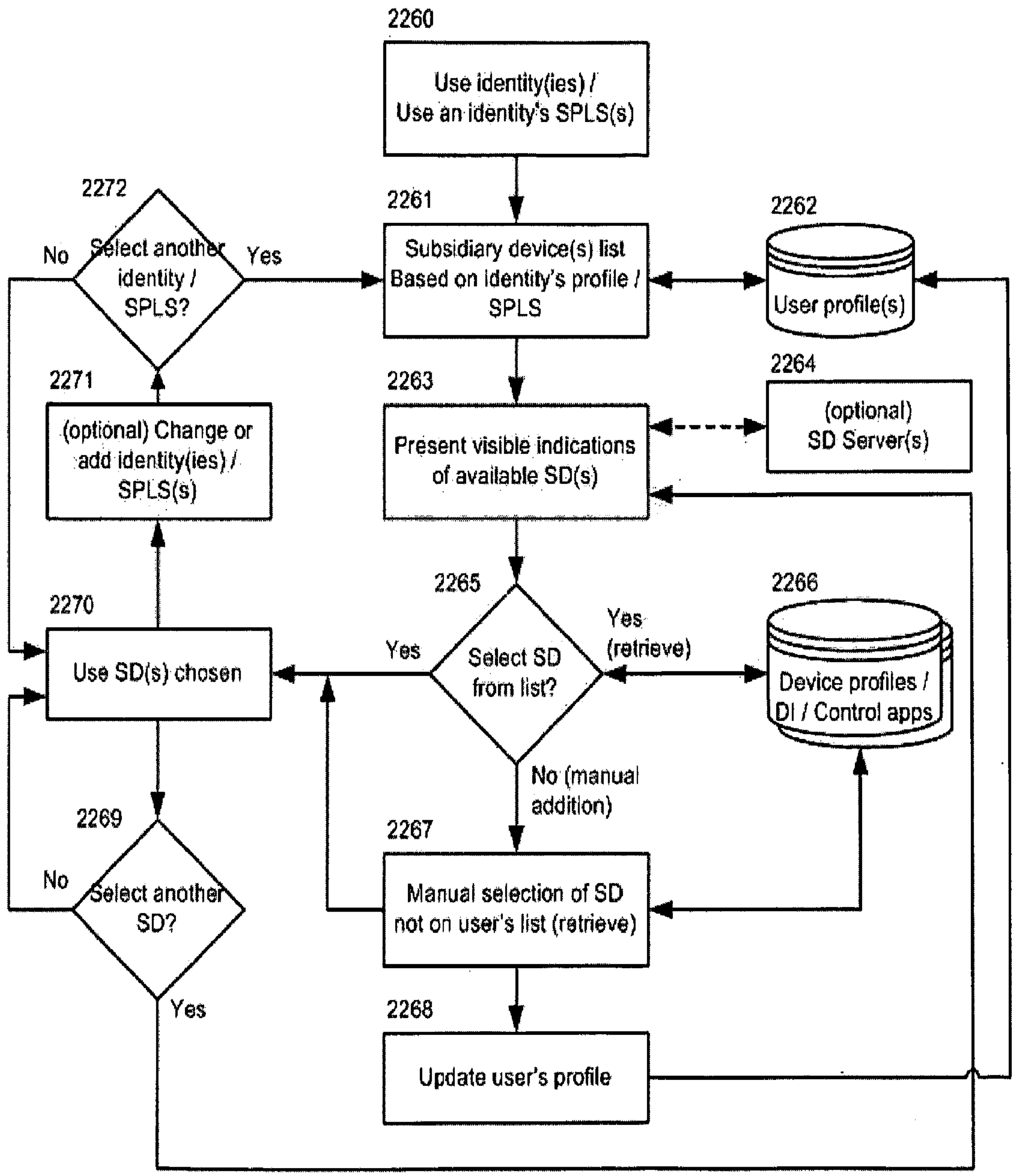
FIG. 57 is a flow chart showing some examples of procedures for one person with a plurality of identities selecting and using subsidiary devices.

FIG. 57, "RCTP—Plurality of Identity(ies) with Subsidiary Device(s)": In some examples a single user selects an identity and that automatically (and/or manually) retrieves and opens one or a plurality of that identity's SPLS(s), which may include one or a plurality of SD's that may be accessed and remotely controlled directly. Optionally, in some examples said identity may access and use one or a plurality of SD's by means of an SD server. Selecting an SD retrieves the appropriate record(s) and/or application(s) required to access and use the selected SD. In some examples a user may access a plurality of SD's to use them simultaneously.

Figure 58A:
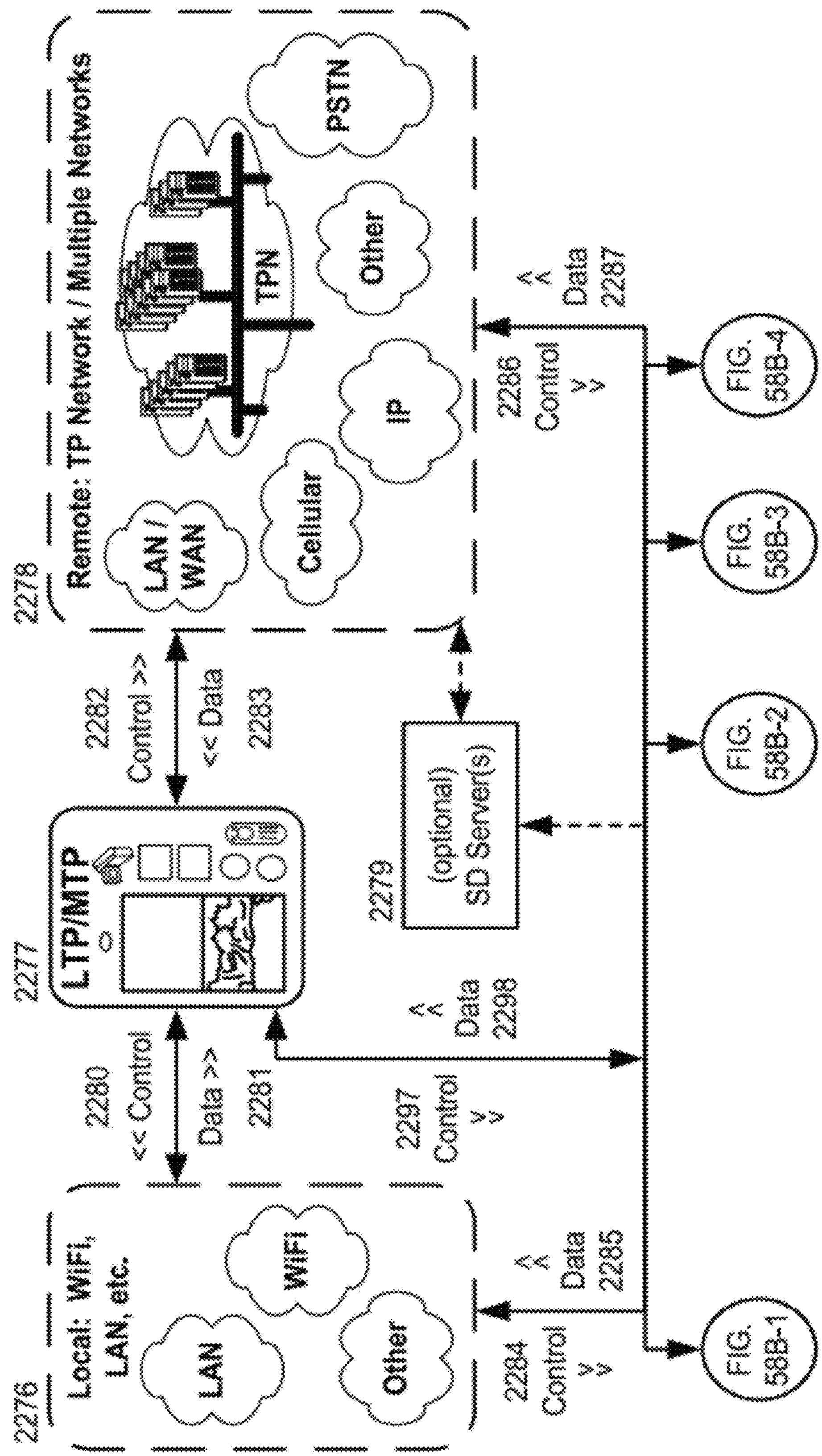
FIG. 58 is a pictorial block diagram that illustrates some examples of control and data processes for accessing and using a plurality of types of subsidiary devices.
Figure 58B:
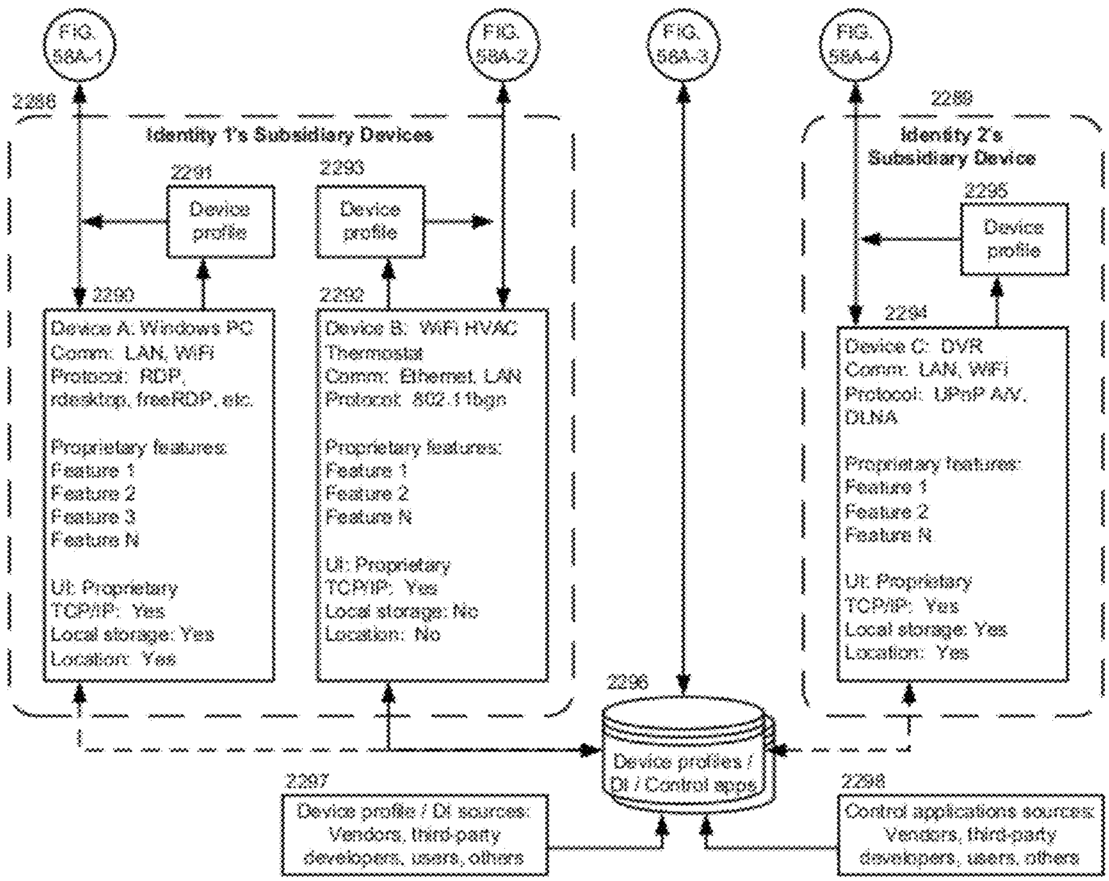

FIG. 58, "RCTP—Summary Subsidiary Devices Control/Data Process": In some examples a CD (Controlling Device) is connected to one or a plurality of SD's that have different device profiles, different data formats, and different local storage, to communications for remote control. In some examples a configurable CD receives and utilizes stored device profile data and/or (an optional) control application(s) in some examples from an SD, in some examples from local storage, in some examples from remote storage, and in some examples from another source such as a vendor, a user or others. In some examples said device drove file and/or control applications are utilized, in some examples with RCTP processing, to access and control one or a plurality of SD's by receiving data from each SD and sending commands to each SD in some examples by one or a plurality of networks.

Figure 59:
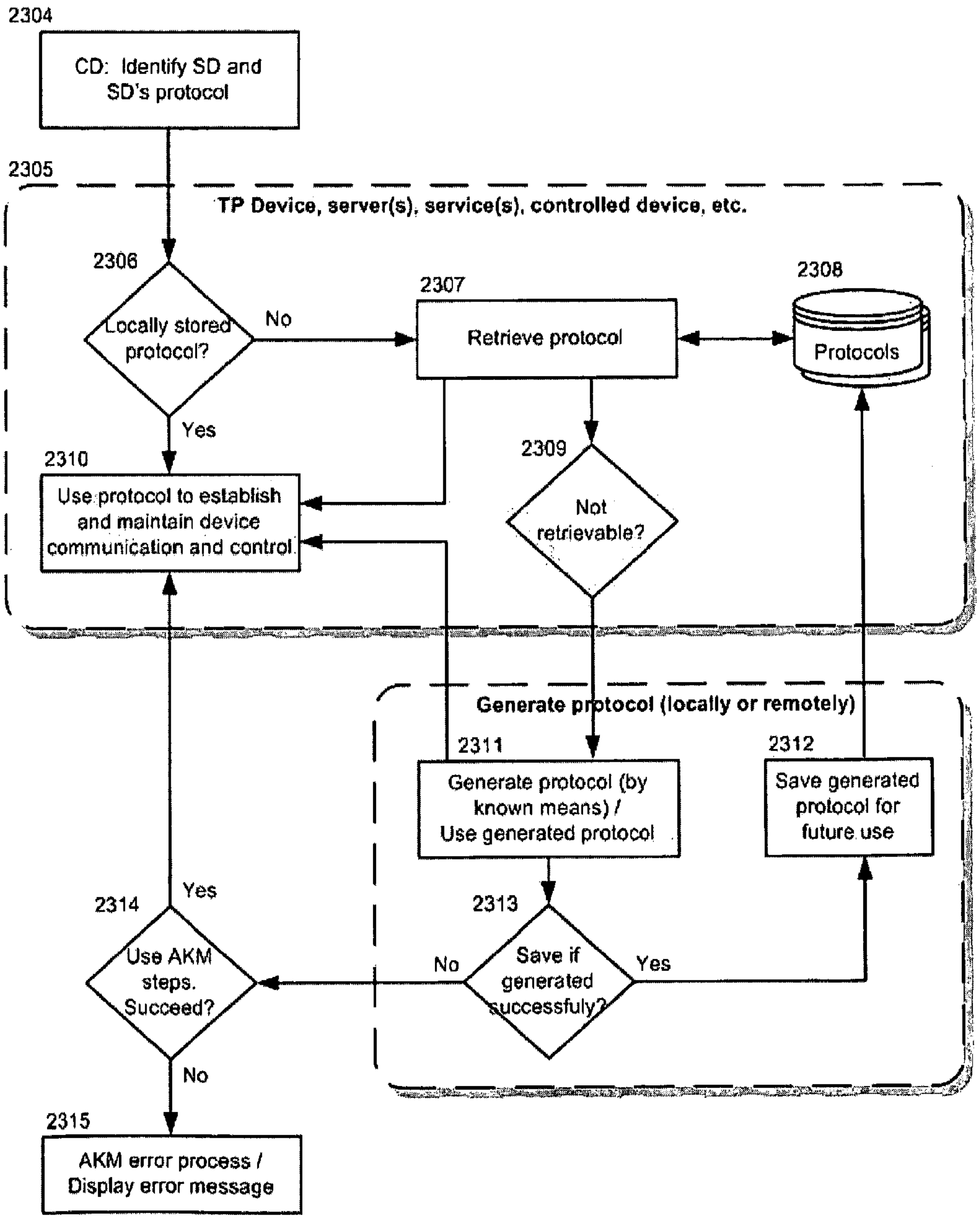
FIG. 59 is a flow chart showing some examples of procedures for retrieving protocols, and/or generating a protocol, for subsidiary device communication and/or control.

FIG. 59, "RCTP—Subsidiary Devices Protocols": In some examples a protocol employed in communications and/or control between a CD and an SD may be retrieved in some examples from local storage, in some examples from remote storage, and in some examples from another source. In some examples a protocol is not retrievable and in some examples one or a plurality of parts of the required protocol may be generated; if generated successfully, in some examples said generated protocol may be saved for future use by one or a plurality of future users. In some examples a retrieved and or generated protocol is utilized to establish and maintain communications and/or control between a CD and an SD.

Figure 60A:
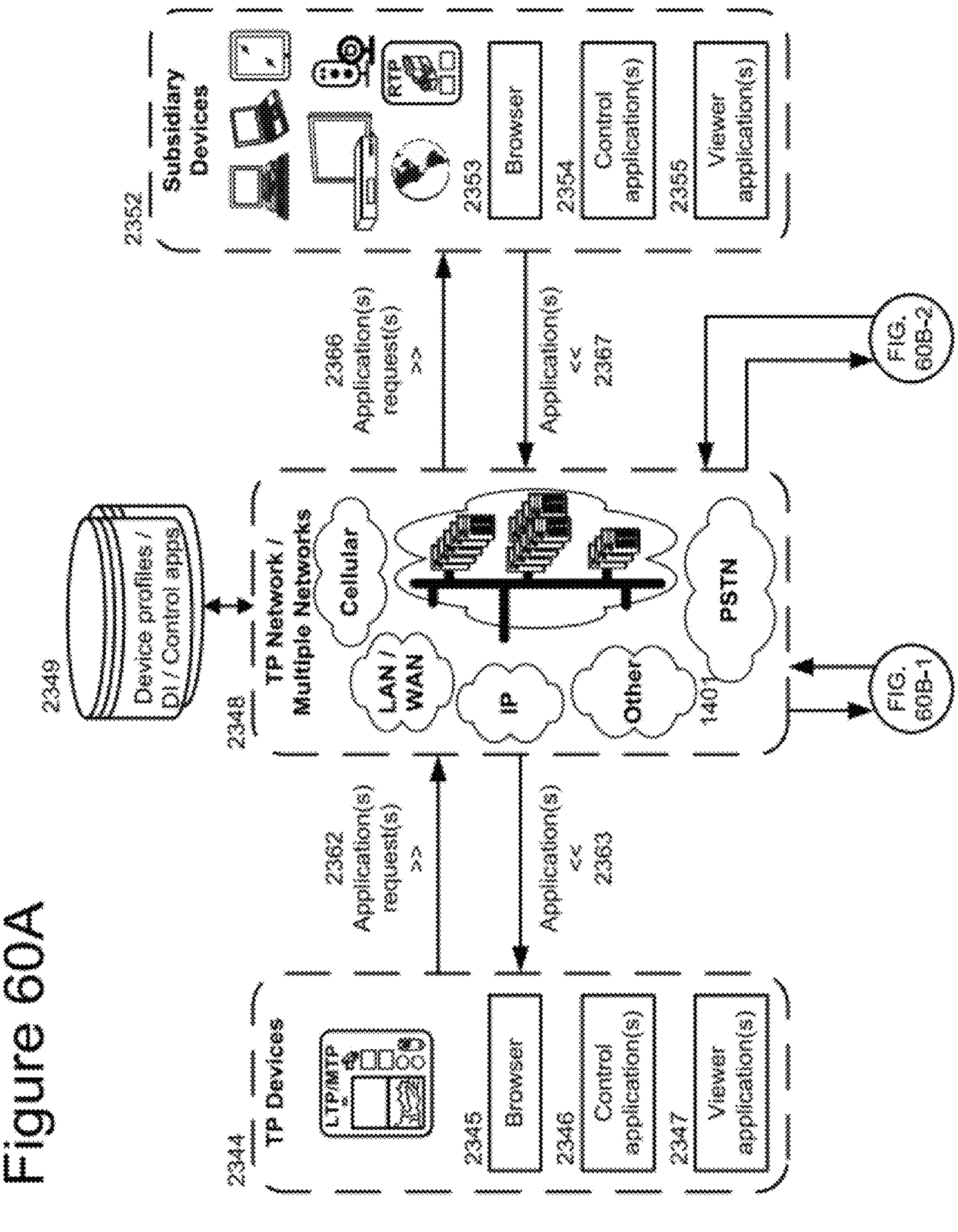
FIG. 60 is a block diagram showing some examples of utilizing a control application, a viewer application, and/or a browser to use a subsidiary device(s).
Figure 60B:
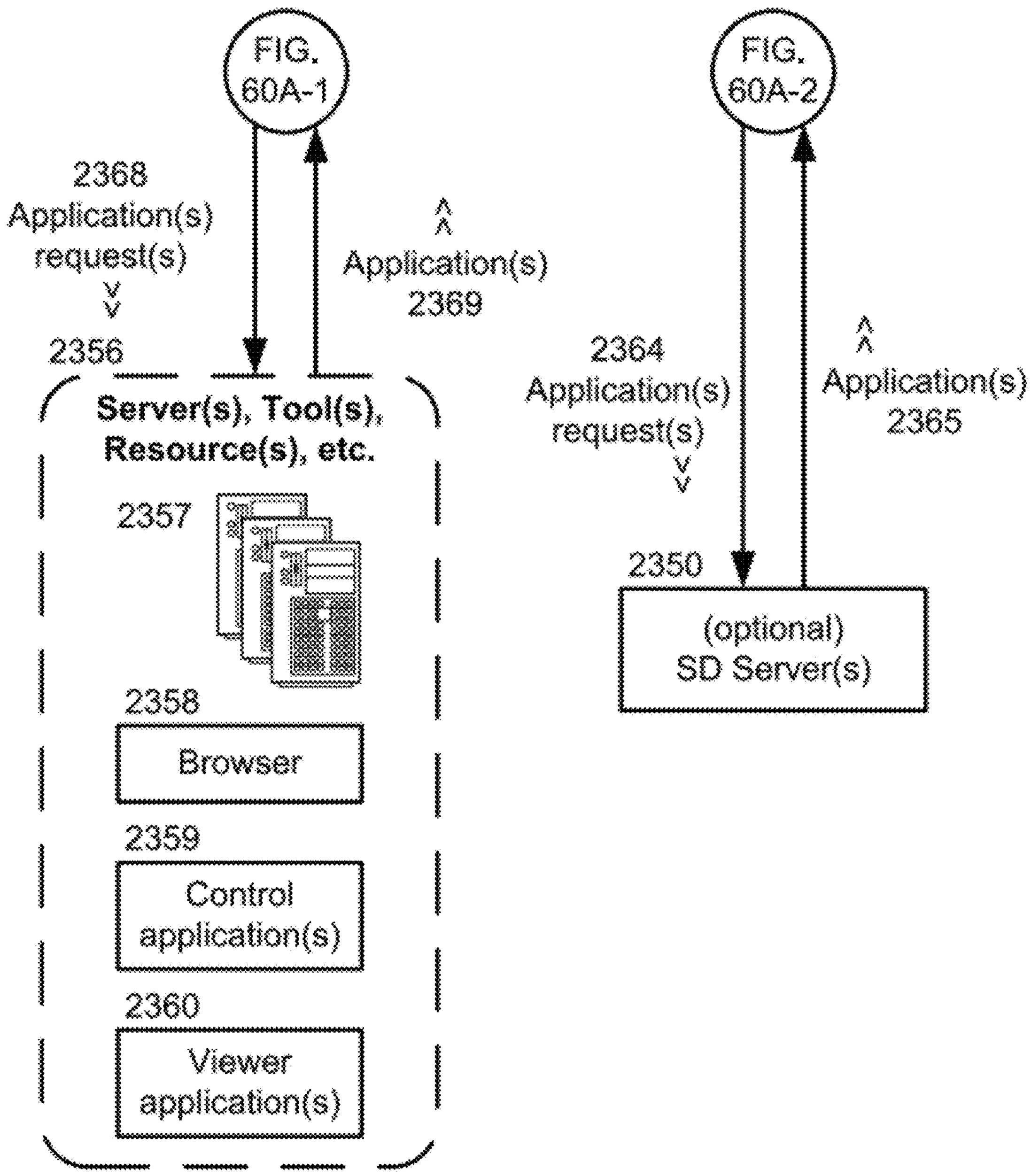

FIG. 60, "RCTP—Control and Viewer Application(s)": In some examples control applications and/or viewer applications are run by a CD (Controlling Device). In some examples control applications and/or viewer applications are run by an SD. In some examples control applications and/or viewer applications are run in some examples a server(s), in some examples by a third-party service(s), in some examples by a another means for external control of one or a plurality of SD's. In some examples control applications and/or viewer applications are downloaded from and/or run by an SD server. In some examples control applications and/or viewer applications can be requested and downloaded from a plurality of sources. In some examples after being requested and downloaded control applications and/or viewer applications can be stored for faster future retrieval and use.

Figure 61:
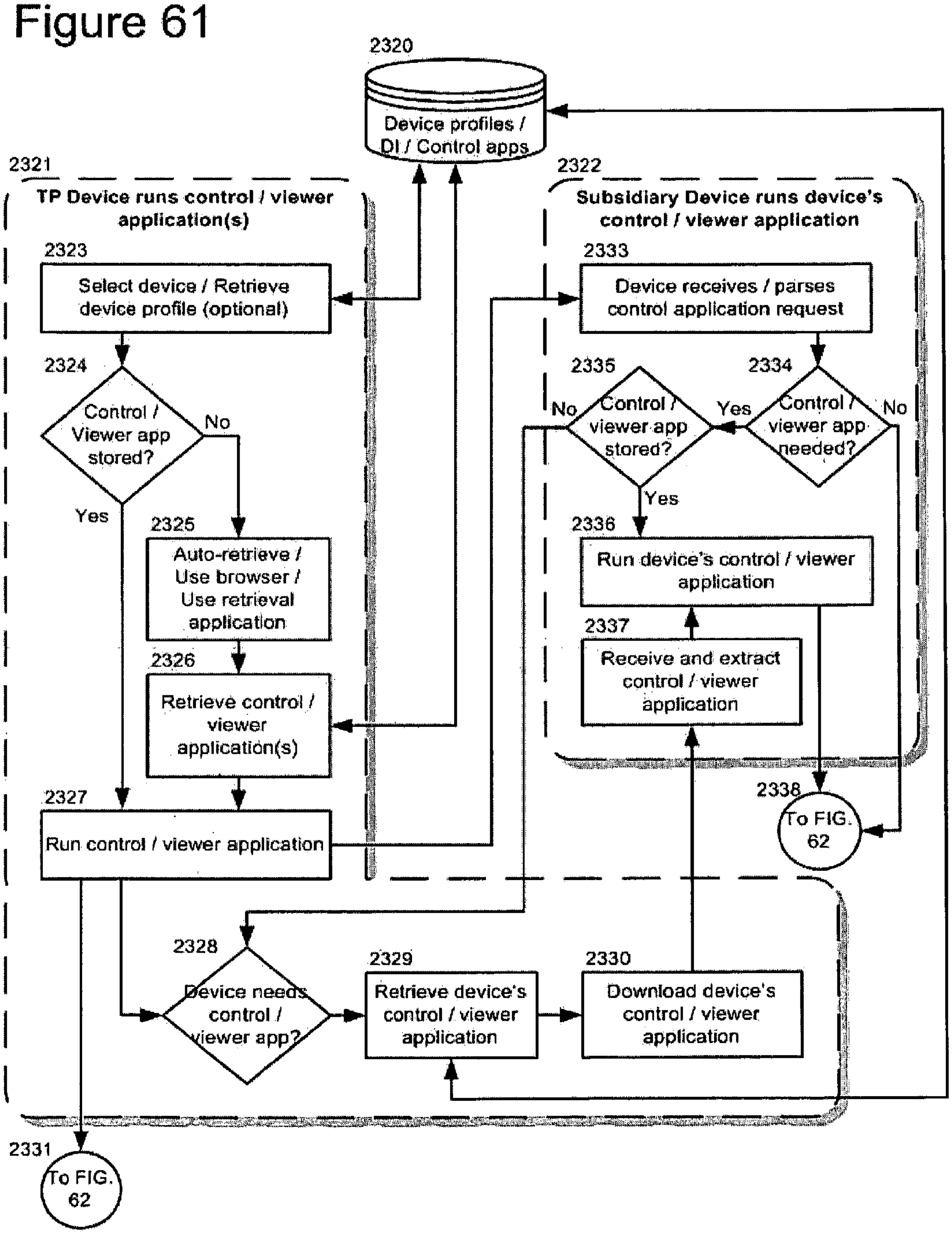
FIG. 61 is a flow chart showing some examples of procedures for initiating and running a subsidiary device control and/or viewer application.

FIG. 61, "RCTP—Initiate Control and Viewer Application (s)": In some examples a user utilizes a CD and selects an SD for remote control which may (optionally and if needed) request and retrieve the device profile from one of a plurality of sources; and in some examples said SD selection me (optionally and if needed) request and retrieve the required control application and/or viewer application from one of a plurality of sources, and execute said application(s). In some examples said device profile and application(s) may be auto-retrieved from one of a plurality of sources; and in some examples said device profile and application(s) may be manually retrieved from one of a plurality of sources. In some examples a remote control interface may be generated under program control such as when a uniform remote control interface is desirable; and in some examples said generated remote control interface can include a subset of factored standard commands based on each SD's device profile. In some examples and SD needs a control application and/or viewer application and does not have that stored locally, in which case means are provided for a CD to retrieve the application (s), download it to the SD and execute it.

Figure 62:
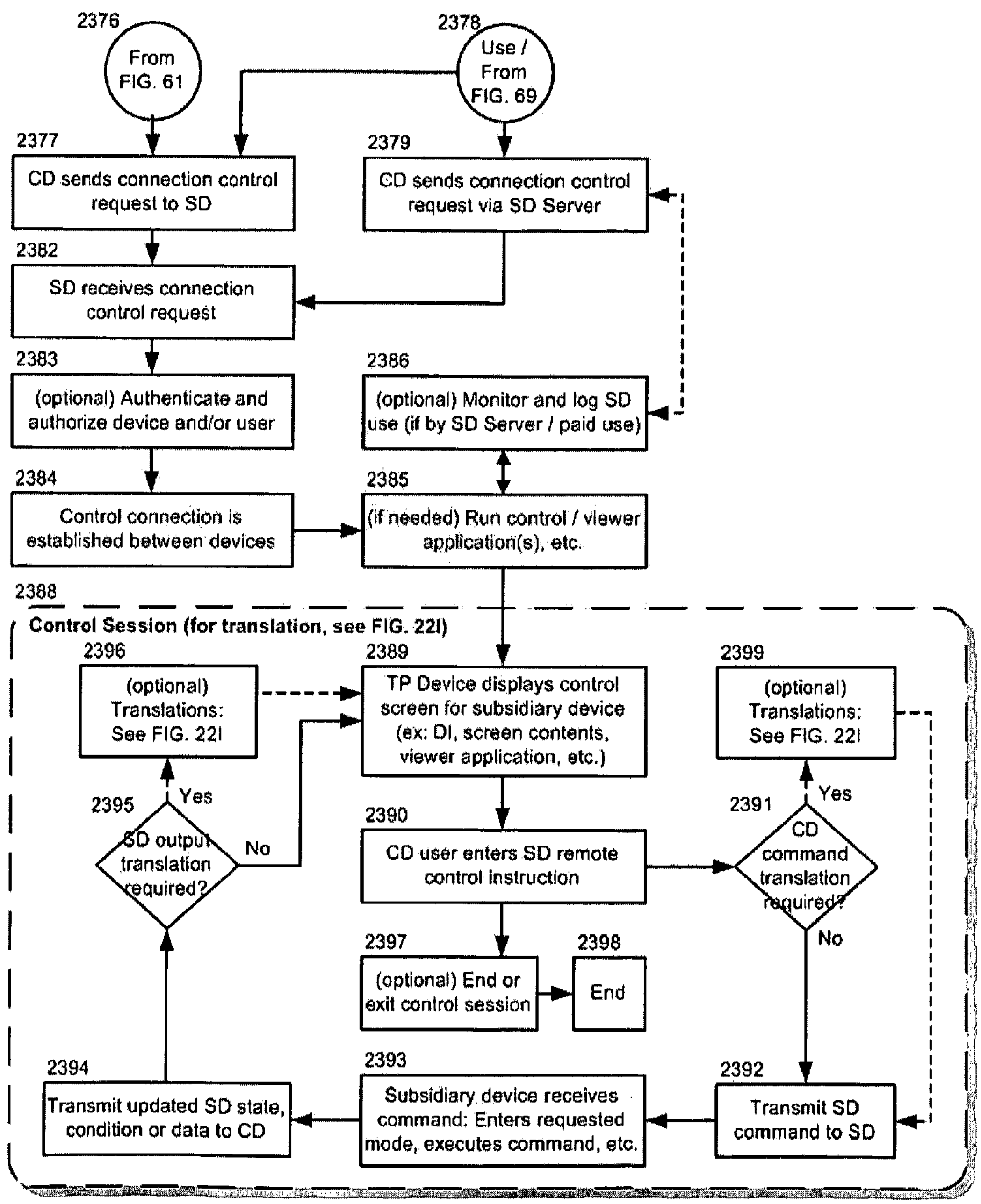
FIG. 62 is a flow chart showing some examples of procedures for controlling a subsidiary device.

FIG. 62, "RCTP—Control Subsidiary Device": In some examples a CD selects an SD and sends a connection control request to said SD; and in some examples a CD utilizes an SD server to select said SD. In some examples said selection is followed by the automated or manual retrieval and execution of the appropriate device profile, control application and/or viewer application for remote control. In some examples said application(s) is used to send a connection control request to said SD by means of the appropriate protocol. In some examples a CD sends and an SD receives a connection control request, and (optionally the CD, SD and/or identity may be authenticated and/or authorized. In some examples the CD connects to the SD using in some examples a known communications protocol and in some examples a known control protocol, and in some examples a generated protocol is used (as described elsewhere). In some examples after a control connection is established between devices a control session includes in some examples running a control application and/or viewer application; in some examples displaying at the CD a control interface which displays available remote control options and may be employed to enter one or a plurality of remote control instructions. In some examples translation is not required so the selected control instruction may be transmitted to the SD which receives the command and executes it; in some examples the SD transmits updated SD state information, condition or data to the CD; in some examples translation is not required so the received SD data is displayed by the control interface at the CD. In some examples translation is required for remote control instructions issued and transmitted by a CD (which is described elsewhere) to be received and utilized by an SD; and in some examples translation is required for updated SD state, condition or data that is transmitted to a CD (which is described elsewhere) to be received and displayed by a CD in an updated control interface. In some examples one or a plurality of SD instructions and uses may be logged such as during some paid uses of an SD.

Figure 63:
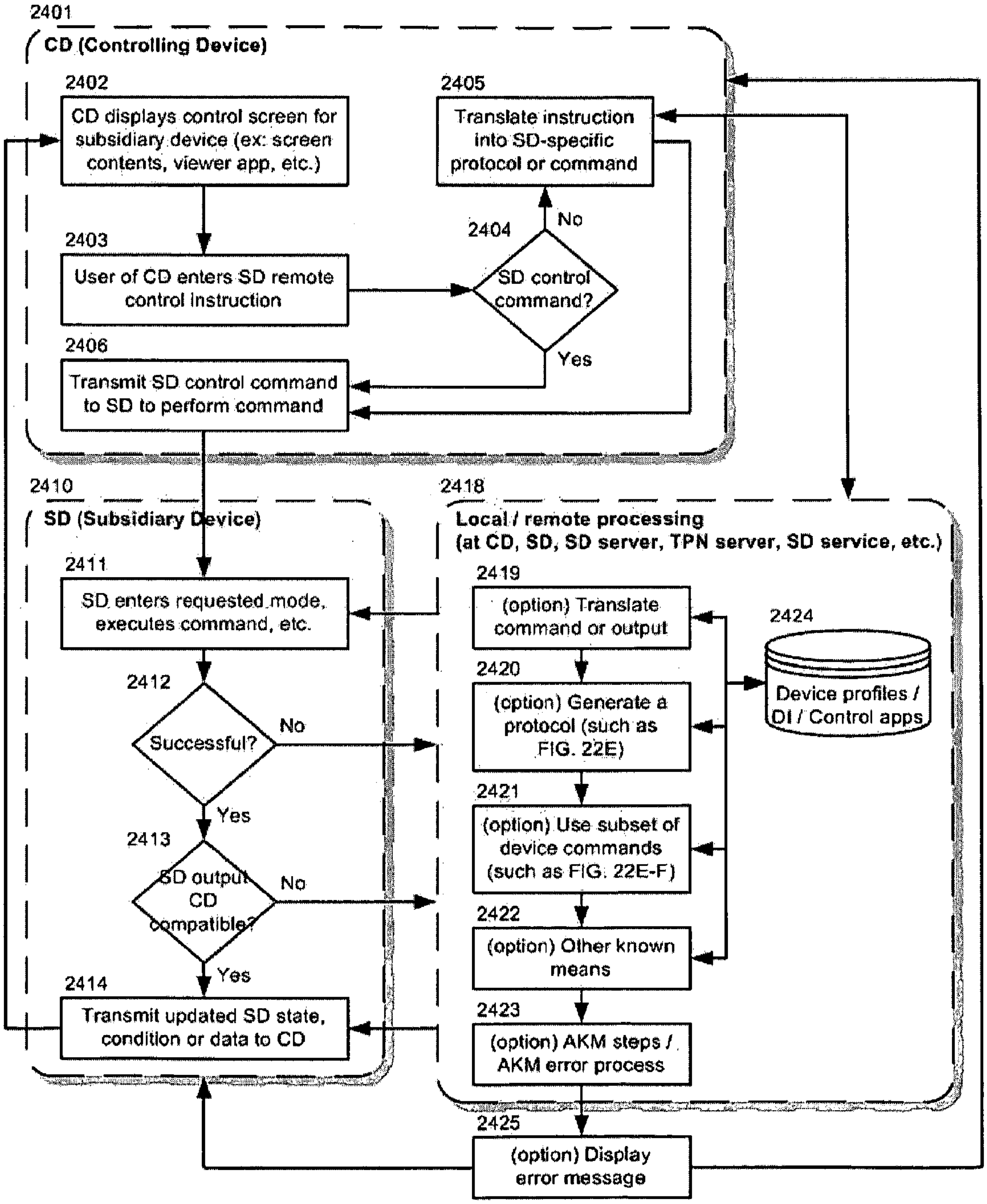
FIG. 63 is a flow chart showing some examples of procedures for translating inputs and outputs between a controlling device and a subsidiary device.

FIG. 63, "RCTP—Translate Inputs to SD and Outputs from SD": In some examples a networked SD capable of control can be managed and controlled by a CD even if said CD requires translation in one or both directions (in some examples when transmitting instructions or commands, and in some examples when receiving updated SD state, condition or data after it executes said instructions or commands. In some examples a CDs instructions are translated into an SD's commands or protocol. In some examples the output from the new SD state, as the condition, SD data, etc. is translated into SD data that is compatible with the CD's remote control. In some examples said translation(s) can be performed in one or a plurality of apparatuses, applications or services; in some examples said translation utilizes an industry-standard protocol; in some examples said translation utilizes a proprietary protocol; in some examples said translation utilizes a generated protocol (as described elsewhere); and in some examples said translation is accomplished with a custom integration between the devices that may in some examples utilize a subset of device commands, and in some examples provide translation by other known means (as described elsewhere).

Turning now to FIG. 55, "RCTP—Subsidiary Devices Summary," some examples of layers in an RCTP architecture are illustrated. In some examples an affected industries electronic devices layer 2226 includes a range of electronic subsidiary devices 2227 as described elsewhere. In some examples a subsidiary device's components layer 2212 includes the components of a wired and/or wireless electronic device 2213, which in some examples includes a CPU 2219 coupled to a wired network interface 2223 for communicating with a network such as a LAN 2224 and a Controlling Device (herein CD) such as an LTP or an MTP; in some examples includes a CPU 2219 coupled to a wireless network interface 2223 and an optional antenna 2221 for communicating with a wireless network or directly with a device remote control such as WiFi 2222, Bluetooth 2222, IR (line-of-sight infrared) 2222, cellular radio 2222, etc. and thereby with a CD such as an LTP or an MTP; in some examples includes a CPU 2219 coupled to memory 2214 which may also load and run an optional control application 2215 or an optional viewer application 2215 (as described elsewhere); in some examples includes a CPU 2219 coupled to (optional) video processing 2216, audio processing 2216, graphics processing 2216, television tuner processing 2216, or other media processing 2216; in some examples includes a CPU 2219 coupled to (optional) storage 2217 that may store data or applications utilize in Remote Control Teleportaling such as in some examples a stored control application 2217, and some examples a stored viewer application 2217, in some examples a stored device profile 2217, in some examples a stored device interface 2217, in some examples one or a plurality of communications protocols 2217; in some examples includes a CPU 2219 coupled to an (optional) display 2218, which in some examples may be a touch screen display 2218, in some examples may be an LCD display 2218, and in some examples may be another type of visual display 2218; in some examples includes a CPU 2219 coupled to one or a plurality of user interfaces 2220 such as in some examples a keypad 2220, in some examples a keyboard 2220, in some examples a pointing device 2220, in some examples a control panel 2220, in some examples buttons 2220, in some examples dials 2220, in some examples a voice command interface 2220, in some examples other types of user interface controls 2220 as described elsewhere.

In some examples said electronic subsidiary device(s) 2227 wireless 2222 or wired 2223 interconnections may be directly with a CD such as an LTP or an MTP; in some examples said wireless 2222 or wired 2223 interconnections may be with a CD such as an LTP or an MTP over one or a plurality of networks; in some examples said wireless 2222 or wired 2223 interconnections may be with one or a plurality of SD server(s) over one or a plurality of networks, and said SD server(s) provide interconnections with a CD such as an LTP or an MTP. Alternatively, a CD (the controlling device) may be a different type of SD (subsidiary device) such as in various examples a mobile phone 2228, a wearable electronic device 2228, a PC 2229, a laptop 2229, a netbook 2229, a digital tablet 2229, an electronic pad 2229, a video game 2229, a server 2229, a digital television 2230, a set-top box 2230, a DVR (digital video recorder) 2230, a television rebroadcaster 2230, a Web service 2232, a remote service 2232, etc.

In some examples an individual's subsidiary devices (layer 2201) includes one or a plurality of records 2202 that may be contained in one or a plurality of databases, with each record containing data that corresponds to an identity's device 2203 2204 2205 2206 2207 2208 2209 2210 or with each record containing data that corresponds to a device associated with an SPLS 2203 2204 2205 2206 2207 2208 2209 2210. In some examples said records 2202 are stored by an identity's CD; in some examples said records 2202 are stored remotely but accessible by said identity's CD; and in some examples said records 2202 are associated with one or a plurality of SD server(s). Collectively, said records contain data that corresponds the subsidiary devices 2202 associated with an individual 2201.

For ease of illustration, only a portion of the database 2202 is illustrated relating to a components layer 2212 2213 and an affected industries electronic devices layer 2226 2227; though said database 2202 may contain other subsidiary device data utilized in providing access to, and control of, specific SD's. As shown in said SD layer 2201, an individual's SD's 2202 and/or a server's SD's 2202 includes one or more records, each associated with an SD. In some examples each record contains data corresponding to an SD such as in some examples an identity name field 2203 contains the name of one of an individual's identities (as described elsewhere; such as John Smith); in some examples an SPLS name field 2203 contains the name of one of an individual's SPLS's (as described elsewhere; such as family, coworkers, members of team X, etc.); in some examples an identity/SPLS name field 2203 contains the combined name of one of an individual's identities combined with the name of one of said individual's SPLS's (as described elsewhere; such as John Smith/family); in some examples a device name field 2204 contains a user's name for a specific device 2204 (such as laptop, mobile phone, etc.); in some examples an icon field 2204 contains an icon or symbol that represents said device graphically (wherein said icon or symbol may be provided by a vendor, based on a vendor's logo, selected by a user to fit a personal preference, etc.); in some examples a device's vendor field 2205 contains a device's vendor's name (such as Apple, HP, Samsung, etc.); in some examples a device's model name field 2205 contains a device's model name (such as iPhone4, G62m laptop, 6500 TV, etc.); in some examples a vendor/device model name field 2205 contains the combined name of a vendor combined with a device's model name (such as Apple/iPhone4, HP/G62m laptop, Samsung/6500 TV, etc.); in some examples a device's communications protocol(s) field 2206 contains the names of the device's communications protocol(s) (such as RDP, Modbus, UPnP, etc.); in some examples a device's address field 2207 contains the device's address (such as its IP address such as the IPv4 address 170.12.250.4, or an IPv6 address); in some examples a device's interface field 2208 10 device's network interface or it's communications interface (such as Ethernet, LAN, WiFi, line of sight IR, etc.); in some examples a device's control application(s) field 2209 contains the name (including version number) of its control application or the name (including version number) of its viewer application (as described elsewhere), and in some examples contains the device's control application 2209 and/or it's viewer application 2209; in some examples a login requirement field(s) 2210 contains whether login and/or authentication is required and if so data such as a login ID and/or password, or whether said subsidiary device may be accessed without login, authentication or authorization 2210; in some examples other subsidiary device data may be included as needed to provide access to, and control of, a subsidiary device(s).

In some examples each SD record is representative of a single SD device and contains data for selecting said device, accessing said device, and accessing and running the appropriate control and/or viewer application(s) to control said device (which will be discussed in connection with subsequent figures). The fields in said record may contain the actual items (such as in some examples icons or symbols, in some examples control or viewer applications, etc.) or alternatively maybe pointers to locations in storage or memory (whether local or remote) where the relevant data may be found and retrieved.

RCTP—Plurality of Simultaneous Subsidiary Devices: The control of subsidiary devices (SD's) is a departure from today's practice of requiring each person to own a plethora of different types of electronic devices in order to access and use their different features, functions and capabilities. The combination of TP devices and SD's has the potential to assist in converging different types of digital electronics into a single model—a digital environment (as described elsewhere)—which in some examples includes direct use of a spectrum of different digital devices' features and capabilities from one or a plurality of TP devices. Turning now to FIG. 56: "RCTP—Simultaneous Plurality of Subsidiary Devices," a user 2240 who employs a TP device 2241 has continuous access to visible indications of the availability of a plurality of SD's 2242 2248, which in some examples provides access to that user's owned SD's 2250, and in some examples provides access to additional remote SD's 2251 such as through an (optional) SD server(s) that may be accessed, controlled and used on demand—together providing means to quickly identify and employ the features, functions and capabilities of a wide range of subsidiary devices without necessarily needing to own and/or physically use them locally. Instead, a range of digital electronic devices, tools, services, applications, etc.—together an emerging plurality of digital capabilities that exists with and alongside one's owned electronic devices—may be used and run from one or a plurality of controlling devices 2241.

In some examples a user 2240 employs a Controlling Device (herein a CD) which may be an LTP 2241 which includes a display, means for user interaction, a CPU, memory, storage, communications, and software (as described elsewhere). In some examples a user may employ visually simple and clear means 2242 2248 on said CD to select an icon, name, label, menu choice, graphical object or other clear and direct representation of an available SD (subsidiary device) 2227 2213 2202 from the display of a CD 2241. In some examples rather than displaying said SD's on CD 2241, a list of SD's or a graphical representation of available SD's may be transmitted for display and selection on a remote control held by a user 2240 (such as described elsewhere such as in some examples a URC [Universal Remote Control] described in part in FIG. 36 and FIG. 37). In some examples said user 2240 employs an electronic device to access one or a plurality of SD servers 2251 which include databases that, among other things, associate user requests for SD's with currently available and accessible SD's (as described elsewhere); and said SD server(s) 2251 provide a list of SD's or a graphical representation of available SD's that is transmitted for display and selection; with that user's selection of one or a plurality of SD's transmitted to the SD server 2251. After a user selects one or a plurality of SD's, said selection(s) is communicated to CD processing 2250 which retrieves the selected SD's record 2202 either locally or remotely, including said record's data and address 2203 2204 2205 2206 2207 2208 2209 2210, and initiates CD processing 2250, SD access and SD control (which are described in more detail elsewhere).

In some examples a single user 2240 with a single CD 2241 may be used to simultaneously access and control a plurality of SD's 2252 2253 2254 2255, including accessing and controlling other TP devices 2255 by RCTP means as if they were SD's. Providing means for a single user 2240 to access, view and control multiple SD's provides a greater span of control for a single user, such as to provide seamless navigation and control over multiple simultaneous activities, tasks, resources, tools, devices, etc. in multiple locations. In some examples this is accomplished by means of a TP device 2241 (such as described in more detail elsewhere) which in some examples includes an intuitive user interface and supervisory/management processing that provides interactions and control with one or a plurality of SD devices.

As illustrated in FIG. 56 in some examples a user 2240 utilizes an LTP 2241 to receive and display 2242 2248 indications of available identities and SPLS's (which include IPTR as described elsewhere—Identities, Places, Tools and Resources—which include SD devices; and which may also list SD's independently of a user's identities and SPLS's); in some examples selecting one or a plurality of SD's from said displayed indications 2252 2253 2254 2255; processing each said selection to obtain access and control of each selected SD; administering (optional) user authorization and authentication to be permitted control over each SD; displaying on the user's CD "windowed" means to control and view the output from each SD device (as described elsewhere) such as a PC laptop 2243 2253, a set top box with a DVR 2244 2252, a video game system 2246 2254, and an RTP digital reality (as described elsewhere) running on a remote RTP 2247 2255; entering an instruction on the CD for one of the SD's; if needed, translating the instruction into a device-specific command; relaying to the SD the instruction or device-specific command; receiving and performing the instruction by the SD; transmitting the SD's output to the CD; and receiving and displaying each SD's output on the CD's display 2243 2244 2246 2247.

In some examples a CD apparatus and system 2241 allows for simultaneous control of one or a plurality of SD's that are connected to said CD. Each SD is separately viewed in an "SD window" 2243 2244 2246 2247 wherein each SD's window contains the processed video signal(s) from that one separate SD, and each window may be moved and/or resized as desired. In some examples a CD, such as a TP device 2241, has substantial capacity for multiple simultaneous operations (as described elsewhere in more detail) that in some examples includes simultaneously controlling a plurality of subsidiary devices; while in some examples a CD may have less capacity (such as in some examples where a CD is a netbook, an electronic tablet, a mobile phone, or other electronic device that includes a display, means for user interaction, CPU, memory, storage, communications, and appropriate application software). In each example the number of SD's that may be controlled directly and simultaneously may vary based on each CD's capacity such that some CDs may provide simultaneous control of a larger number of SD's than other CD's can provide. Alternatively, in some examples a smaller CD such as an AID/AOD (such as a mobile phone running a VTP) may control a larger capacity TP device like an LTP, and utilize the larger LTP device's capacities to control more SD's simultaneously, wherein the LTP communicates all the SD windows, controls and outputs within one focused connection to the AID/AOD.

In some examples control over each SD is managed by processing signals from the CD device's 2241 user interface (s) (as described elsewhere, including both direct interfaces such as a pointing device, keyboard, voice, and other means, and also including a URC [Universal Remote Control]). In some examples the focus of a user interface passes from one SD window to another 2243 2244 2246 2247, such as by using a pointing device's pointer to point at a PC laptop's window 2243 and thereby highlight it and make it the focus for instructions, and then moving said pointer over a set top box's window 2244 and thereby highlighting said second window and make said second SD window the focus for instructions, and subsequently point at any desired SD device's window which both highlights it and makes that SD the focus for commands and instructions. As said user interface is employed to move the focus from one SD window to another, CD processing automatically generates the necessary user interface signals to interact with each highlighted and focused SD. In some examples to control a particular SD 2243 2244 2246 2247, a user 2240 moves the user interface pointer to highlight that particular SD's window. Then, to control a different SD the user 2240 highlights the desired SD's window. If the user does not want active control of one or a plurality of SD's, the user may focus the user interface off of any one or all of the SD devices.

In some examples an SD device continues performing the last instruction received even when active control is moved away from it, such as in some examples a PC laptop 2243 2253 continues to run the previous software applications that were started (such as in some examples a web browser with multiple tabs open, word processing a document, receiving and replying to e-mail, etc.); in some examples a set top box with a DVR 2244 2252 continues to play a recorded movie or a currently broadcast television show; in some examples a video game 2246 2254 continues running a game; in some examples an RTP 2247 2255 continues to display a real remote place and the specific digital reality applied to it; etc. In some examples an SD's continuing operation(s) may be changed by using a user interface to highlight that SD window and make that SD the focus, then use the SD window interface to issue a new instruction(s) or command(s).

In some examples each SD's audio is managed by the CD 2241 processing the audio from each source 2243 2244 2245 2246 2247 separately and providing automatic and manual audio control over which audio is played, which audio is muted, and the volume of each SD source that is played. As with the video signals, in some examples audio signals are transmitted from each SD 2252 2253 2254 2255 to the CD 2241 for processing and output. In some examples the audio from each SD is sent from their respective outputs to an audio controller and processor within the CD. Said audio controller and processor controls an audio mixer that is connected to the CD's audio amplifier(s) and speaker(s). In some examples the simultaneously received SD audio signals are mixed and controlled so that they match the current preferences of a user 2240, with some user preferences automated and some user preferences manually controlled. In some examples the audio is automated so that only a highlighted window plays audio, so that focusing the user interface on a specific SD window plays its audio; in this example moving the focus to the video game window 2246 plays its audio and mutes other audio sources, while then moving the focus to the set-top box 2244 turns on its broadcasted audio while muting the other sources. In some examples the audio from all sources is mixed and manually controlled so that all audio sources 2243 2244 2245 2246 2247 are available with each SD's volume under user 2240 control; in this example a user could listen to a set top box broadcast show 2244 at a normal full volume while playing a video game 2246 softly and muting other sources. In some examples the audio is mixed and played with a combination of automated and manual controls so the combination matches a user's preferences with as little manual adjustment as possible; in this example a user could set all focused connections 2245 with others to automatically and always be set at full normal volume, while adjusting other sources manually 2243 2244 2246 2247 as desired at any given time.

In some examples a CD can utilize remote control means (as described elsewhere) to select between the plurality of simultaneously controlled SD's the one SD that the user wants to control remotely at a given moment. In some examples a user can select between the plurality of simultaneously controlled SD's the two or a plurality of SD's that the user wants to control remotely at a given moment. In some examples a user can select two or a plurality of remotely controllable SD's to perform a single remote control instruction that corresponds to said plurality of selected SD's; such as in some examples to open two or a plurality of SD's simultaneously, in some examples to end the remote control session with two or a plurality of SD's simultaneously, in some examples to start the recording function of two or a plurality of SD's by entering a single remote control instruction; and in some other examples to perform a different but commonly available remote control feature or function with two or a plurality of SD's simultaneously.

As illustrated in the examples in FIG. 56, said CD user 2240 has a focused real-time connection (as described elsewhere) with another identity (user) 2245. Said CD user 2240 may share the output from one or a plurality of SD's 2243 2244 2246 2247 with the other identity 2245. In some examples the other identity 2245 may be passed remote control over one or a plurality of remotely controlled SD's 2243 2244 2246 2247. Alternatively, in some examples said CD 2241 may be used to broadcast (as described elsewhere) the output from one or a plurality of SD's 2243 2244 2246 2247 to one or a plurality of recipients. Alternatively, in some examples said CD 2241 may utilize one or a plurality of SD servers 2251 to obtain remote control over one or a plurality of SD's 2227 2213 2202, and said CD 2241 may be used to broadcast (as described elsewhere) the output from one or a plurality of SD's 2243 2244 2246 2247 to one or a plurality of recipients. In some examples RCTP enables a digital environment with far more productive and widespread uses of a limited number of SD's by a larger number of users and recipients of their output. In some examples an RCTP system and apparatus may be described as turning unitary and generally solitary electronic devices into virtualized resources that may be accessed and employed by a plurality of users and audiences.

Plurality of Identity(ies) with Subsidiary Device(s): As described elsewhere in some examples TP devices enable a consistent system wherein subsidiary devices (SD's) and the applications, services, features, functions, and capabilities they provide are logically and automatically available for connection and use—in other words, selecting available SD's may be automated and direct. While it may be imagined that it is complicated to select and use one or a plurality of identities, and then select one or a plurality of subsidiary devices, the use of a TP device 2241 may include in some examples the identification of a user 2240, in some examples the identification of one or a plurality of said user's identity(ies) 2240 2242 2248 (as described elsewhere), or in some examples the selection of one or a plurality of one of said user's identities' SPLS(s) 2240 2242 2248 (as described elsewhere). In each example the selection of a user, identity, and/or SPLS automatically retrieves and displays the appropriate continuous visible indications of the appropriate SD's 2242 2248 that may be used. This is automated so there is reduced need to search and figure out the available SD's, such as for example even a basic user being presented with SD choices so they can perform immediately at advanced levels.

FIG. 57, "Plurality of Identity(ies) with Subsidiary Device (s)," illustrates some examples in which a user selects an identity 2260 (as described elsewhere), and some examples in which a user selects an SPLS (as described elsewhere). Said user's selection of identity(ies) 2260 and/or SPLS(s) 2260 causes retrieval 2261 2262 and display 2263 of a subsidiary device list 2261 from information stored in one or a plurality of user profile databases 2262. In some examples said subsidiary device list 2261 is based on an identity's profile 2262, while in some examples said subsidiary device list 2261 is based on an identity's selected SPLS(s) 2262. Following said retrieval 2261 2262, the appropriate subsidiary device(s) list 2263 is presented to the user 2263 as described elsewhere (such as in some examples 2242 2248 in FIG. 56). In some examples said indications of available subsidiary device(s) 2263 2242 2248 may be retrieved from an optional SD server 2264 (as described elsewhere in more detail) to provide access to subsidiary devices from multiple remote sources.

In some examples a user selects a SD 2265 from the presentation of available SD's 2263, local and/or remote records are accessed that in some examples include a database with records and resources for each type of SD, in some examples with records for each individual SD, in some examples the actual individual SD's, and in some examples other sources. Based on each device's record in some examples, or device's response in some examples, the appropriate data on that device is retrieved 2266 which in some examples includes a device profile 2266, in some examples includes a device interface (herein "DI") 2266, in some examples includes a control application 2266, and in some examples includes a viewer application 2266. In some examples said retrieval(s) for a selected device 2265 may have been performed previously 2266 and may have been stored locally for faster retrieval in the future. In some examples said retrieval(s) for a selected device 2265 may not have been performed previously and therefore retrieval from remote storage 2266 is required. In some examples one or a plurality of said retrieval (s) for that device 2265 may have been performed previously but not stored locally, and therefore retrieval from remote storage 2266 is required. In some examples the availability of an owned SD 2261 2262 triggers said retrievals for all owned SD's 2266 so the appropriate device profile 2266, DI 2266, control application(s) 2266, and viewer application(s) 2266 our stored locally for faster owner access to all owned SD's in the future. In some examples after running appropriate RCTP components (as described elsewhere) for an identity's known SD 2261 2262 or for an SPLS's known SD 2261 2262, the SD is used 2270.

In some examples a user manually selects a device 2265 2267 that is not among the available SD's presented 2263, the appropriate data on that device is retrieved 2267 2266, which in some examples is a device profile 2266, in some examples is a DI 2266, in some examples is a control application 2266, and in some examples is a viewer application 2266. Since said manual selection has not been performed before, said retrieval(s) for that manually added device have not been performed previously and therefore retrieval from remote storage 2266 is required. When these retrieval(s) 2267 2266 are performed, said retrieved data may be stored locally for faster retrieval in the future (based on the assumption that an SD that is used once is more likely to be used again). In some examples the manual selection of a device 2265 2267 triggers the automatic addition of said device in some examples to the currently opened user 2268 2242 2248, in some examples to the currently open identity(ies) 2268 2242 2248, and in some examples to the currently open SPLS(s) 2268 2242 2248—in all examples to update the available SD's presented 2263. In some examples after running appropriate RCTP components (as described elsewhere) for a manually selected SD 2267 2266, said SD is used 2270.

In some examples indications of available subsidiary devices 2263 2242 2248 have been retrieved from an optional SD server 2264 (as described elsewhere in more detail) such as to provide access to other types of subsidiary devices or their applications, content, services, broadcasts, functions, features, capabilities, etc. that a user does not own. When a user selects a device 2263 from an optional SD server 2264, the appropriate data on that device is retrieved 2267 2266, which in some examples is a device profile 2266, in some examples is a DI 2266, in some examples is a control application 2266, and in some examples is a viewer application 2266. Since said SD has not been used before, said retrieval(s) for that added device have not been performed previously and therefore retrieval from remote storage 2266 is required. When these retrieval(s) 2267 2266 are performed, said retrieved data may be stored locally for faster retrieval in the future (based on the assumption that an SD that is used once is more likely to be used again). In some examples the selection of an SD from an SD server 2263 2264 triggers the automatic addition of said device in some examples to the currently opened user 2268 2242 2248, in some examples to the currently open identity(ies) 2268 2242 2248, and in some examples to the currently open SPLS(s) 2268 2242 2248—in all examples to update the available SD's presented 2263. In some examples after running appropriate RCTP components (as described elsewhere) for a SD selected from an SD server (s) 2263 2264 2267 2266, said SD is used 2270.

In some examples a user may choose to employ more than one SD 2263 by taking control of another SD 2269, or by changing from one SD 2270 to another SD 2269. In this case, in some examples another SD is selected by means described elsewhere 2263 such as in some examples by visible indications of known SD's 2261 2262 2263 2265 2266 2270, in some examples by manually selecting an SD 2265 2267 2266 2270, and in some examples by selecting an SD from an SD server 2264 2263 2265 2267 2266 2270. In some examples a user may choose to change one or a plurality of identities 2271 2272 while using the same SD(s) 2270 by changing the currently logged in identity(ies) 2271 2272, or by adding one or a plurality of identity(ies) 2271 2272. In this case, in some examples a different identity is selected, or one or a plurality of additional identities are added (by means described elsewhere) and this results in the use of the same SD 2270 by the new identity(ies). In some examples the previously described automation is immediately performed with the addition of each new identity 2271 2272—such as in some examples retrieving the appropriate SD's associated with each identity 2261 2262 2264, in some examples presenting visible indications of that identity's available SD's 2263, and then automating the connection and running of each SD selected 2265 2266 2267 2268 2270 based upon each selection of an SD 2265.

In some examples a user may choose to change one or a plurality of SPLS(s) 2271 2272 while using the same SD(s) 2270 by changing the currently logged in SPLS(s) 2271 2272, or by adding one or a plurality of SPLS(s) 2271 2272. In this case, in some examples a different SPLS is selected, or one or a plurality of additional SPLS(s) are added (by means described elsewhere) and this results in the use of the same SD 2270 by the new SPLS(s). In some examples the previously described automation is immediately performed with the addition of each new SPLS 2271 2272—such as in some examples retrieving the appropriate SD's associated with each SPLS 2261 2262 2264, in some examples presenting visible indications of available SD's 2263 in that SPLS, and then automating the connection and running of each SD selected 2265 2266 2267 2268 2270 based upon each selection of an SD 2265.

In these and other examples one or a plurality of identities, or one or a plurality of SPLS's, are enabled to use one or a plurality of SD's. Rather than requiring a user to remember, choose and control multiple steps during each addition of each SD, any current SD device state is maintained unless it is terminated, and the process of adding one or a plurality of SD's in some examples by one or a plurality of additional identities, and in some examples by one or a plurality of additional SPLS's, is automated so that it is simplified.

Subsidiary Devices Control Process (SDCP): FIG. 58, "RCTP—Subsidiary Devices Control Process (SDCP)," illustrates some examples for connecting a CD (controlling device) 2277 to one or a plurality of SD's (subsidiary devices) 2290 2292 2294 that have different device profiles 2291 2293 2295 2296, different data formats 2290 2292 2294, and different local storage 2290 2292 2294, to communications for remote control. In some examples of a SDCP, SD's include components such as described in FIGS. 55 and 2290 2292 2294, and may optionally store data in predetermined locations and predetermined format 2290 2294, with locally stored device profile data 2291 2295 and/or remotely stored device profile data 2293 2296 that relates to each SD; some examples of a SDCP include a configurable CD that may perform remote control of said SD(s) such as an LTP 2277 or an MTP 2277, which receives and utilizes stored device profile data 2291 2293 2295 2296 to receive data from said SD and to send control commands to said SD; some examples of a SDCP include a configurable data translator that responds to the device profile data 2291 2293 2295 2296 by receiving data from said SD and transforming it so that it may be incorporated into a control interface (as described elsewhere), and transforming control commands to said SD's data format (as described elsewhere); some examples of a SDCP include remote control communications that connect one or a plurality of CDs 2277 with one or a plurality of SD's 2290 2292 2294; some examples of a SDCP include access to one or a plurality of remote sources for retrieval of SD profiles 2266 in some examples, SD device interfaces (herein "DI") 2266 in some examples, control applications 2266 in some examples, and viewer applications 2266 in some examples.

In some examples the remote control communications is selected to provide any subset of in some examples direct remote control communications between a CD 2277 and one or a plurality of SD's 2290 2292 2294 by wired, wireless, Bluetooth, IR, or other communication means such that control commands are sent 2297 from a CD to an SD, and SD data is sent 2298 by a SD to a CD; in some examples remote control communications over a local network between a CD 2277 and one or a plurality of SD's 2290 2292 2294 such that control commands are sent 2280 2284 from a CD to an SD via a local network, and SD data is sent 2285 2281 by a SD to a CD via said local network; in some examples remote control communications over one or a plurality of wide area networks between a CD 2277 and one or a plurality of SD's 2290 2292 2294 such that control commands are sent 2282 2286 from a CD to an SD via a local network, and SD data is sent 2287 2283 by a SD to a CD via said local network; in some examples remote control communications via an (optional) SD server 2279 between a CD 2277 and one or a plurality of SD's 2290 2292 2294; in some examples the use of an (optional) SD server 2279 to identify one or a plurality of available SD's 2290 2292 2294, then perform remote control communications over a network between a CD 2277 and one or a plurality of SD's 2290 2292 2294; in some examples a SD extracts and communicates to a CD data representing its operating state and parameters on demand from a CD; in some examples a SD extracts and communicates to a CD data representing its operating state and parameters at programmed periodic intervals; in some examples a SD extracts data representing its operating state and parameters and stores it locally in memory for later communication to a CD; in some examples a CD receives data representing the operating state and parameters of a SD on demand; in some examples a CD receives data representing the operating state and parameters of a SD at programmed periodic intervals; in some examples a CD receives data representing the operating state and parameters of a SD and stores it locally in memory for later use by the CD; in some examples a CD transforms data representing the operating state and parameters of a SD so that it may be incorporated into a control interface (as described elsewhere); in some examples a CD provides a user interface in the form of a graphical window or screen that is used to see the state of a SD and/or select control instructions to be performed by a SD; in some examples a CD provides a user interface in the form of text options that are used to see the state of a SD and/or select control instructions to be performed by a SD; in some examples a CD provides a user interface in the form of one or a plurality of indicators, menus or choices that are used to see the state of a SD and/or select control instructions to be performed by a SD; in some examples a CD provides a user interface in another form of visual user interface that is used to see the state of a SD and/or select control instructions to be performed by a SD; in some examples a CD transforms control instructions into a SD's control commands in the SD's data format (as described elsewhere); in some examples a CD communicates control instructions to a SD where they are performed by the SD; in some examples a CD communicates transformed control commands to a SD where they are performed by the SD.

SDCP Summary: In some examples the SDCP described herein provide one or a plurality of CDs (controlling devices) the ability to adapt to one or a plurality of SD's (subsidiary devices). Said adaptation in some examples is based upon an industry standard; in some examples said adaptation is based on an industry standard that a device vendor has followed in part and altered in part; and in some examples said adaptation is not based on a uniform or industry standard because a device vendor has not utilized one. In some examples this adaptation customizes and configures varying parts of said CD's software, processing, communications, protocols, data transformation(s), etc. while enabling it to use a consistent hardware platform. Said SDCP adaptation is expressed in the form of a device profile file. In some examples a CD's hardware and communications software may be adapted to fit a variety of different manufacturers, components, networks, protocols, etc. such as a subset of a CD 2277, communication network(s) 2276 2278, SD's 2290 2292 2294, and in some examples an (optional) SD server(s) 2279, and in some examples a remote source of device profiles 2266, in some examples a remote source of DI's 2266, in some examples a remote source of control applications 2266, and in some examples a remote source of viewer applications 2266.

Device profile: In some examples adaptations accommodate the differences based on instructions provided in the device profile of each SD 2291 2293 2295 2296, where the device profile's structure and definition encapsulates the variability of each SD. In some examples the device profile file addresses variability such as in some examples the communications physical interface; in some examples serial communication port settings; in some examples serial communication protocol; in some examples network communication port settings; in some examples network communication protocol; in some examples data locations (such as in some examples a register address, in some examples addresses, in some examples storage location[s]); in some examples data attributes (such as in some examples how data is represented such as by types [integer, floating-point, Boolean, etc.], conditional based on a parameter, min/max scaling, alarm conditions, alarm levels, or any processing that produces meaning [such as status codes, alarm codes, transforms, etc.]); in some examples operating states; in some examples parameters (such as in some examples how the data should be accessed, in some examples a method for retaining data in memory, in some examples the frequency of data access, etc.); in some examples device instructions or commands; in some examples instructions transformation specification, or commands transformation specification (as described elsewhere); in some examples device interface screens; in some examples user interface screens. In some examples a device profile utilizes and follows an industry standard; in some examples a device profile utilizes part but not all of an industry standard; and in some examples a device profile is independent of industry standards. In some examples the device profile is altered by addition; in some examples the device profile is altered by subtraction; in some examples the device profile is altered by extension; and in some examples the device profile is altered as additional subsidiary device variability is developed and added. In some examples a device profile allows adaptive representation of SD data, so a CD can adapt to the different and varying ways that each manufacturer and vendor represents the data within each device.

In some examples a CD requests and receives data collected from a SD; and in some examples a CD receives data transmitted by a SD. In some examples said received data is transformed based on values defined in a device profile (as described elsewhere), and placed and stored in a data table based on values defined in a device profile, for remote control use by a CD. In some examples said remote control instructions are transformed into device control commands (as described elsewhere) for transmission to an SD. As a result in some examples a device profile provides adaptability to the variability of a given SD from a given manufacturer or vendor.

Sources: In some examples a device profile 2291 2293 2295 2296 is defined and provided by a device's vendor 2290 2292 2294 2297; in some examples a device profile 2291 2293 2295 2296 is defined and provided by a third-party developer 2297; in some examples a device profile 2291 2293 2295 2296 is defined and provided by a device user 2297; in some examples a device profile 2291 2293 2295 2296 is defined and provided by others such as an open-source contributor 2297 or an SD access service 2279. In some examples a control application 2296 2277 is defined and provided by a device's vendor 2290 2292 2294 2298; in some examples a control application 2296 2277 is defined and provided by a third-party developer 2298; in some examples a control application 2296 2277 is defined and provided by a device user 2298; in some examples a control application 2296 2277 is defined and provided by others such as an open-source contributor 2298 or an SD access service 2279. In some examples a viewer application 2296 2277 is defined and provided by a device's vendor 2290 2292 2294 2298; in some examples a viewer application 2296 2277 is defined and provided by a third-party developer 2298; in some examples a viewer application 2296 2277 is defined and provided by a device user 2298; in some examples a viewer application 2296 2277 is defined and provided by others such as an open-source contributor 2298 or an SD access service 2279.

Application: In some examples a device profile is installed in a device by its vendor at the time of manufacture and remains unchanged unless that individual device is reconfigured or updated; in some examples a device profile is interpreted and placed in a device by command or instruction, and the resulting remote control operation of said device is configured by the specific device profile used, in which case one or a plurality of devices are updated as soon as the device profile utilized is updated; in some examples after a device is configured by a device profile (whether the device profile is installed at manufacture or placed in a device by command or instruction) additional changes may be made to the configuration of said device by transmitting it to the device and installing it by command or instruction.

Subsidiary Devices Protocols: Turning now to FIG. 59, "RCTP—Subsidiary Devices Protocols," some examples illustrate the retrieval or generation of an appropriate protocol (s) for communications and/or control between a CD (controlling device) and an SD (subsidiary device) over a communication network, or in some examples by direct communications between a CD and an SD. In some examples a CD is capable of controlling an SD as described elsewhere using a control protocol(s) and/or a communications protocol (s) that in some examples is a standard that is already developed (such as in some examples RDP [Remote Desktop Protocol], in some examples UPnP [Universal Plug and Play and its DCP, or Device Control Protocol], in some examples Modbus, in some examples DLNA [Digital Living Network Alliance], in some examples WiFi, in some examples 802.11b/g/n, in some examples HTTP, in some examples Ethernet, or in some examples another known protocol); in some examples a protocol that is developed in the future; and in some examples a protocol that is generated as needed by known means then stored for future re-use. In some examples one or a plurality of known and/or generated protocols are stored locally and/or remotely such as in some examples in local memory, and in some examples on a server. In some examples said stored known protocols can be modified such as by addition, deletion, updating, replacing, or editing.

In some examples a CD is utilized to present a list of SD's (as described elsewhere) and when one SD is selected its device profile is retrieved (as described elsewhere). Said device profile identifies said selected SD 2304 and that SD's protocol(s) 2304, providing data so the CD can determine the type of SD being controlled remotely 2304, and the protocol (s) required in some examples for communications 2304 and in some examples for control 2304. In some examples said CD uses the identified SD protocol(s) 2304 to determine if said protocol(s) is known and stored locally 2306, or if not then if it is known and stored remotely 2306. In some examples said protocol(s) 2304 is known and stored locally 2306, in which case it is recognized by the system and retrieved for use in establishing and maintaining SD communication and control 2310, and remote control proceeds 2310. In some examples said protocol(s) 2304 is known but not stored locally 2306, in which case it is recognized either system and retrieved 2307 from remote protocol storage 2308 (such as in some examples in a server[s], in some examples in a protocol database[s], in some examples in a protocol library [ies], in some examples in a protocol access service[s], in some examples in another storage device[s]) for use in establishing and maintaining SD communication and control 2310, and remote control proceeds 2310.

In some examples said protocol(s) 2304 is not known 2306 2307 and/or not retrievable 2309 then a uniform standard protocol is retrieved and used to generate a protocol (herein named "generated protocol") based upon said device's device profile 2311 (as described elsewhere). In some examples said generated protocol 2311 is successful enough to use it in establishing and maintaining SD communication and control 2310, and remote control proceeds 2310. In some examples said generated protocol 2311 is successful enough to be used 2310 and is then saved for future re-use 2313 2312 in said remote protocol storage 2308 (as described elsewhere). In some examples the attempt to generate a protocol 2311 fails 2313 and in that case AKM steps are employed 2314 (as described elsewhere); if said AKM steps succeed 2314 then the resulting solution 2314 is used in establishing and maintaining SD communication and control 2310, and remote control proceeds 2310; but if said AKM steps fail 2314 then the AKM error process initiates 2314, and an appropriately worded error message is displayed to the user 2315.

In some examples a generated protocol 2311 is created by utilizing a uniform standard protocol and data in a device profile. In some examples said uniform standard protocol is stored locally 2306, and in some examples said uniform standard protocol is retrieved from remote protocol storage 2308. In some examples said generated protocol 2311 is created by factoring and abstracting common elements, instructions, commands, data types, etc. out of the uniform standard protocol and the specific SD's device profile, and then generating a protocol using the common elements 2311. In some examples said generated protocol 2311 is created by factoring and abstracting common elements, instructions, commands, data types, etc. out of the uniform standard protocol and the specific SD's device profile, and then creating a translation table using the common elements 2311 and writing said translation table to memory with said translation table used to establish and maintain SD communication and control 2310 (as described elsewhere). In some examples identifiable common elements include common elements in protocols such as in some examples identification(s), in some examples user IDs, in some examples create, in some examples select an instruction, in some examples perform an instruction, in some examples provide state information, in some examples set an alarm or an alarm condition; in some examples terminate a session, in some examples other common elements can be used instead of or in addition to these examples; non-common elements are discarded; and a new "common protocol" is generated based on the common elements.

In some examples a third-party (such as in some examples the vendor of the SD, in some examples a developer of similar SD protocols, in some examples a developer of standard protocols, in some examples a user of that SD, or in some examples another third-party) provides information such as which elements of the SD's protocol are unique and which are common. In some examples a generated protocol 2311 may be created by an application or a module that is designed to recognize, identify and extract common elements from one or a plurality of unknown protocols.

In some examples after said generated protocol 2311 has been generated, it is used to establish and maintain SD communication 2310, and remote control proceeds 2310; and in some examples said generated protocol 2311 is used to establish and maintain SD control 2310, and remote control proceeds. Therefore, in some examples a CD will support retrievable protocols A through N while a specific SD runs protocol X, and the two devices may still establish CD's remote control of said SD using a generated protocol 2311 based common elements between a uniform standard protocol and protocol X. As a result, some CDs can establish remote control of some SD's that run different and unknown protocols without needing to develop (ahead of time and by a separate developer or by a separate development effort) a unique protocol or interface for that combination of CD and SD. In addition, said generated protocol 2311 can be saved 2312 in remote protocol storage 2308 for future retrieval 2307 and re-use 2310 by that combination of CD and SD. As a result in some examples differences in some communications protocols and some control protocols may be abstracted out in a system, method or process that provides for connecting some CDs with some SD's in some examples; and a system, method or process that provides for some CDs to control some SD's in some examples. In addition, in some examples the protocols of new CDs and new SD's may be written to a set of common elements that fit said protocol generation capability 2311 and at least approximate a uniform standard protocol, and thereby new devices may be made capable of communications and remote control in an easier and more direct process.

In some examples these systems, methods and processes may be implemented with hardware; in some examples they may be implemented with software (such as in some examples program code, in some examples instructions, and some examples modules, in some examples services); and in some examples they may be implemented with a combination of both hardware and software (such as in some examples a server running an application and storing a database, in some examples a service, in some examples a protocol generation application). In some examples these may take the form of software that runs on hardware and can access stored data so they become an apparatus or machine for practicing this system, method or process.

Control and viewer applications: FIG. 60, "RCTP—Control and Viewer Applications," illustrates some examples in which control applications 2346 2353 2359 and/or viewer applications 2347 2355 2360 are run in some examples by one or a plurality of CDs (controlling devices) 2344, in some examples by one or a plurality of SD's (subsidiary devices) 2352, in some examples by one or a plurality of servers or remote services 2356, and in some examples by one or a plurality of specialized SD servers or services 2350 (as described elsewhere). Said control applications and/or said viewer applications can be requested and downloaded in some examples from remote storage 2349, in some examples from an optional SD server 2350, in some examples from a subsidiary device 2352, in some examples from a server or a service 2356, and in some examples from an SD server or service 2350. Said control applications and/or said viewer applications can be requested and downloaded in some examples by means of a browser 2345 2353 2358 from sources, or by other means as described elsewhere. After being downloaded said control applications and/or viewer applications can be stored locally for faster future retrieval and use, in some examples by CDs 2344, in some examples by some SD's 2352, in some examples by servers or services 2356, and in some examples by SD servers 2350.

Said control application(s) 2346 2353 2359 may be used in some examples for initiating and/or terminating a control session; in some examples for gathering local control information from a subsidiary device, in some examples for sending and/or receiving control information; in some examples for sending and/or receiving control instructions or commands; or in some examples for other known remote control purposes or functions. Said viewer application(s) 2347 2355 2360 may be used in some examples for initiating and/or terminating a session; in some examples for initiating and/or terminating the viewing of a device's interface; in some examples for requesting, sending or receiving a device's current state; in some examples for actively or periodically monitoring a device's current state; or in some examples for other known remote control purposes or functions. In some examples said control application(s) and/or viewer application(s) may be run from or within a browser 2345 2353 2358; in some examples said browser-based application(s) may provide all or a subset the functions and features of a separate control application(s) 2346 2354 2359; and in some examples a separate control application(s) and/or viewer application(s) may provide all or a subset the functions and features of a device's own control interface (s) 2346 2347 2354 2355 2359 2360

In some examples the control application(s) 2346 2354 2359 that run on one or a plurality of CDs 2344, one or a plurality of SD's 2352, one or a plurality of servers 2356, and/or one or a plurality of SD servers 2350 are requested and downloaded by processes that are described elsewhere. In some examples control application(s) and/or viewer application(s) download requests are sent 2362 by a CD 2344, and control application(s) and/or viewer application(s) are received 2363 by a CD 2344. In some examples control application(s) and/or viewer application(s) download requests are received 2366 by a SD 2352, and control application(s) and/or viewer application(s) are sent 2367 by a SD 2352. In some examples control application(s) and/or viewer application(s) download requests are received 2368 by a server 2356 or a database 2349, and control application(s) and/or viewer application(s) are sent 2369 by a server 2356 or a database 2349. In some examples control application(s) and/or viewer application(s) download requests are received 2364 by an (optional) SD server 2350, and control application (s) and/or viewer application(s) are sent 2365 by an (optional) SD server 2350. In some examples control application(s) and/or viewer application(s) download requests are sent by a SD 2352, and control application(s) and/or viewer application(s) are received by a SD 2352. In some examples control application(s) and/or viewer application(s) download requests are sent by a server 2357, and control application(s) and/or viewer application(s) are received by a server 2357.

In variations, in some examples the downloads requested 2362 2366 2368 2364 and sent 2363 2367 2369 2365 may include an individual requests, or any combination or subset of a plurality of requests such as in some examples the downloads requested 2362 2366 2368 2364 and sent 2363 2367 2369 2365 may include device profiles; in some examples the downloads requested 2362 2366 2368 2364 and sent 2363 2367 2369 2365 may include DI (device interfaces); in some examples the downloads requested 2362 2366 2368 2364 and sent 2363 2367 2369 2365 may include protocols or other data required to establish communications; in some examples the downloads requested 2362 2366 2368 2364 and sent 2363 2367 2369 2365 may include protocols, device instructions, or other data required to establish and maintain remote control; in some examples the downloads requested 2362 2366 2368 2364 and sent 2363 2367 2369 2365 may include device instructions or other data required to generate a protocol; in some examples the downloads requested 2362 2366 2368 2364 and sent 2363 2367 2369 2365 may include data required to perform features or functions relating to RCTP systems, methods and/or processes; in some examples the downloads requested 2362 2366 2368 2364 and sent 2363 2367 2369 2365 may include any subset of other data required to perform features or functions relating to RCTP systems, methods and/or processes;

Alternatively, in some examples one or a plurality of download requests are received by remote storage 2349, and said requested downloads are sent by remote storage 2349. Alternatively, in some examples one or a plurality of download requests are received by a CD 2344, and said requested downloads are sent by a CD 2344. Alternatively, in some examples one or a plurality of download requests are received by a Teleportal Utility (as described elsewhere), and said requested downloads are sent by a Teleportal Utility.

Initiate SD Control and Viewer Applications: As described elsewhere, in some examples a control application(s) and/or a viewer application(s) are utilized for RCTP systems, methods and processes; while in some examples these are not utilized. Some examples of the process of retrieving and running said control application(s) and/or viewer application(s) are illustrated in FIG. 61, "RCTP—Initiate SD Control and Viewer Applications," which includes a CD 2321 that requires a control application and/or a viewer application for RCTP control of an SD 2322 that also requires a control application and/or a viewer application.

Said examples begin when a user selects an SD for remote control 2323 (as described elsewhere), which (optionally and if needed) retrieves the device profile 2323 from either local storage 2320, remote storage 2320, or directly from a subsidiary device 2322. In some examples if the required control application and/or viewer application are stored locally 2324, they are retrieved directly and executed 2327. In some examples if the required control application and/or viewer application are not stored locally 2324, they are retrieved 2326 from remote storage 2320, and executed 2327. In some examples the required control application and/or viewer application are not stored locally 2324, then in some examples they may be auto-retrieved 2325 2326 directly as one step in selecting a specific SD, auto-downloaded from remote storage 2320, or retrieved directly from the SD 2322, and executed 2327. In some examples the required control application and/or viewer application are not stored locally 2324, then in some examples they may be manually retrieved by means of a browser 2325 which utilizes a hyperlink, bookmark, button, widget, servlet, search, or other web navigation to open a Web page 2325 that lists the appropriate control application and/or viewer application required so that the user may select it and retrieve it 2326 from remote storage 2320 by downloading, and then execute said downloaded application (s) 2327. Alternatively, in some examples the required control application and/or viewer application are not stored locally 2324, then in some examples they may be manually retrieved by means of remote control interface 2325 or application 2325 which utilizes a button, menu, widget, servlet, search, or other user interface component that lists the appropriate control application and/or viewer application required by the selected SD so that the user may select it and retrieve it 2326 from remote storage 2320 by downloading, and then execute said downloaded application(s) 2327.

Alternatively, a remote control interface may be generated under program control 2327 such as by Java commands, such as in some examples when the required control application and/or viewer application are not stored locally 2324 and they are also not retrievable remotely 2320; or as in some examples when a uniform remote control interface is desirable. In some examples said generated remote control interface can include a subset of factored standard commands based on each SD's retrieved device profile 2320 2322 (such as in some examples turn on, end [control session], exit, pause, suspend, open, run, display, scroll, highlight, link, click, use, edit, save, record, play, stop, fast-forward, fast reverse, pan, tilt, zoom, look up, find, contact, connect, communicate, attach, transmit, disconnect, copy, combine, distribute, redistribute, broadcast, charge, bill/invoice, make payment, accept payment, etc.). Additionally and optionally, in some examples said generated remote control interface may include a uniform interface (as described elsewhere such as in FIGS. 183 through 187) that may be adapted to the specific devices in use (as described elsewhere such as in FIGS. 184 and 185). In some examples a generated interface 2327 may include only a control application 2327, and in some examples a generated interface 2327 may include only a viewer application 2327, and in some examples a generated interface 2327 may include both a control application 2327 and a viewer application 2327.

In some examples the SD 2322 does not need a control application and/or viewer application 2334, in which case it continues processing said CD requests and instructions 2327 2333 as described in FIG. 62 2338. In some examples a selected SD needs a control application and/or viewer application 2334 and has that stored locally 2335, in which case it retrieves said application(s) and runs it 2336. In some examples the selected SD needs a control application and/or viewer application 2334 and does not have that stored locally 2335, in which case it notifies the CD 2338 that it needs a required control application and/or viewer application 2335 2338; in which case the CD can retrieve 2329 the device's required application(s) and download said application(s) 2330 to the SD 2337 where the SD can execute the required application(s) 2336. In some examples, after said required control application and/or viewer applications have been executed 2336 said CD requests and instructions 2327 2333 are processed as described in FIG. 62 2338.

For an illustration, in some examples a user of a CD 2321 selects a specific SD 2323 and its control application is not available on the CD 2324. In some examples a manual process is employed to retrieve and execute said control application. In some examples a web browser is manually opened 2325 on a remote system 2320 which provides its home page. In some examples downloadable SD control applications are accessible from said home page 2325 2320 by means of a hyperlink, a menu, a widget, a servlet, a search field, a support page, a downloads page, or other known web navigation means. In some examples a request for the category or list of downloadable SD control applications 2325 2320 is made using a web navigation means, and the downloadable SD control applications is displayed such as in a list of hyperlinks, a pulldown list, or other known web selection means. In some examples the specific selected SD's control application is selected for download from a known web selection means 2326 2320, and the SD control application is downloaded to the CD. In some examples the CD runs the downloaded application by clicking on it or activating it by other known means 2327.

For another illustration, in some examples of a user of a CD 2321 selects a specific SD 2323 and its control application is not available on the CD 2324. In some examples an automated process is employed to retrieve and run said control application. In some examples the selection of said SD 2323 auto-retrieves its device profile 2324 such as in some examples from local storage 2321, in some examples from remote storage 2320, and in some examples from a selected SD 2322. As described elsewhere, in some examples said device profile includes the name and address of its control application (and/or its viewer application) so the SD selection process includes utilizing said data to auto-retrieve the SD's control application 2325 2326 which in some examples is remote storage 2320 and in some examples is the SD 2322. In some examples the SD control application is a compressed file (such as a zip file) in which case the retrieved file 2326 is auto-extracted and executed 2327.

In some examples when said control application runs 2327, and/or viewer application runs 2327, the control application and/or viewer application sends a request to the SD 2333 and said SD parses and attempts to run the request 2333, which in some examples is a device control request 2333, and in some examples is a viewer (device monitoring) request 2333. In some examples CD requests 2327 2333 may include session creation; instructions, commands or requests within a created session; session deletion; or session timeout. In some examples CD requests may include other processing as described elsewhere, such as in some examples in FIGS. 62 and 63. In some examples communications paths 2323 2326 2327 2320 2333 2335 2328 2330 2337 may be secure (e.g., encrypted), and in some examples communications paths 2323 2326 2327 2320 2333 2335 2328 2330 2337 may be non-secure. In some examples multiple communications paths 2323 2326 2327 2320 2333 2335 2328 2330 2337 may operate within a single session.

Control Subsidiary Device: FIG. 62, "RCTP—Control Subsidiary Device," illustrates some examples of remote control of an SD by a CD. In some examples an SD has been selected 2376 as described elsewhere, and said CD sends a connection control request to said SD 2377. In some examples an SD server 2378 was used to select an SD as described elsewhere, and said CD in some examples sends a connection control request to said SD by means of the SD server 2379, and in some examples said CD sends a connection control request directly to said SD 2377. In some examples the appropriate device profile, control application (s) and/or viewer application(s) have been retrieved and executed as described elsewhere, and said application(s) is used to send a connection control request to said SD 2377 2379. In some examples said connection control request 2377 2379 is sent via communications paths as described elsewhere to initiate a control session; using a messaging system and protocol that the SD supports and a message format that the SD can receive, parse and act upon. In some examples a control session is the period during which an SD is available for control by a CD. In some examples a control session continues after a controlling CD has exited, during which the SD remains active and available for control, until the SD's control session reaches the end of a timeout period. In some examples a control session can be enabled by any remote control technology such as in some examples Microsoft's Terminal Services, in some examples Modbus, in some examples UPnP, in some examples a vendor's proprietary communications and/or control protocol, in some examples a vendor's proprietary adaptation of a standard protocol, in some examples any other known communications and/or remote control technology or application. In some examples an SD receives a connection control request 2382, and (optionally) the CD, SD and/or identity may be authenticated 2383 and/or authorized 2383 using known authentication processes or TP authentication and authorization processes described elsewhere. In some examples after (optional) authentication 2383 the CD connects to the SD 2384 using in some examples a known communications protocol and in some examples a known control protocol; and said protocols are retrieved from memory or storage (whether local or remote) and employed instead connection. In some examples said communications protocol and/or said control protocol are unknown and therefore may be generated to establish said connection and control 2384, as described elsewhere. If a protocol is generated and used to establish a successful connection 2384 it may be stored in a pre-determined library of protocols (as described elsewhere) for future remote control sessions between that type of CD and that type of SD.

In some examples it is after a CD connects to a SD 2384 that a control application 2385 and/or a viewer application 2385 are executed. In some examples it is after a CD connects to a SD 2384 that a DI (Device Interface) is downloaded and displayed on the CD's screen 2389, or other SD data are retrieved and displayed as needed 2389. In some examples a control application 2389 may display said DI and other data on a CD's screen 2389. In some examples a viewer application 2389 may display said DI and other data on a CD's screen 2389. In some examples other known means are utilized to display on a CD's screen means for remote control 2389 such as an interface that lists the available remote control options. In some examples different remote control components, widgets, visual interfaces, etc. may be included in a CD's control screen 2389 for each type of remotely controlled SD 2393; for one example, if the SD contains a PTZ camera then the CD screen may include a compass rose so the camera's Pan, Tilt and Zoom may be remotely controlled; for another example if the SD contains a thermostat then the CD screen may include a vertical (or optionally horizontal) slider with fahrenheit and or centigrade temperature markings with an indicator that a user may move to set a desired temperature; for another example if the SD is a PC then the CD screen may display the entire SD's interface by means such as RDP (Remote Desktop Protocol) for direct user control of the SD PC. In some examples use may (optionally) be monitored 2386 and logged 2386 by known means such as in some examples when said use has been set up by an SD server (as described elsewhere) 2386, in some examples when a user pays for use 2386, in some examples when use is based on a membership or a subscription 2386, in some examples when use is free but includes retrieving and displaying sponsored marketing or messages 2386, and in other types of uses where it is desirable to monitor 2386 and/or log 2386 use(s). Said (optional) monitoring data 2386 and/or (optional) log data 2386 may be communicated by one or a plurality of networks to the appropriate monitoring and/or logging application or facility where said data is received and stored (such as in some examples 2508 2507 in FIG. 69).

In some examples a CD is now capable of controlling an SD, in which the user of the CD can operate the SD to perform any available SD function (such as its features, functions or applications; or settings for any of those features, functions or applications), or use any desired SD resource (such as play, use or edit its stored content) that is available for remote control 2389 2390. In some examples the CD displays 2389 the SD's control panel; in some examples the CD displays 2389 the SD's user interface; in some examples the CD displays 2389 an adapted or third-party developed version of the SD's control panel or user interface; in some examples the CD displays 2389 buttons, icons, GUI interface, lists, control panel, or menus that displays SD instructions, commands and features; and in some examples the CD displays 2389 a subset of the SD's full set of controls. In some examples the CD's display 2389 can be designed and configured in any number of known ways to include any or all of the available SD controls that may be utilized for remote control from a CD.

In some examples the CD's display 2389 can include a "show all" button, link or command to list all of the currently available SD commands or instructions that may be utilized for remote control of the SD; in some examples said "show all" list may be in alphabetical order; in some examples said "show all" list may be a hierarchy; in some examples said "show all" list may be in frequency-of-use order; in some examples said "show all" list may be a multi-level menu; and in some examples said "show all" list may be in a different order or organization. In some examples said "show all" list may be pre-determined, saved and retrieved from storage; while in some examples said "show all" list may be constructed when requested by retrieving the CD's display 2389 from memory, then sorting and reorganizing it in the order and format requested, for display and presentation on demand. In some examples said "show all" list may be searchable by keyword, or by a keyword string. In some examples said "show all" list includes labeled choices that the user may select individually 2390 to control the SD.

In some examples each displayed 2389 or listed 2389 SD instruction 2390, command 2390, feature 2390, icon 2390, GUI interface 2390, widget 2390, etc. has associated with it an SD control command that effects the SD to perform that specific step or function. In some examples the CD's user can enter an SD control instruction 2390 that corresponds to an area of interest by selecting a button 2389, icon 2389, GUI interface component 2389, listed choice 2389, control panel component 2389, menu choice 2389, etc. from the available choices. In some examples said control instruction 2390 selects the SD command associated with said control instruction 2390 and determines if translation into a specific SD control command is required 2391. In some examples no translation is required 2391 and the SD command associated with said control instruction 2390 is transmitted to the SD 2392. In some examples the CD interface 2389 displays one or a plurality of SD instructions 2390 that require translation 2391 2399 into SD commands 2399 before being transmitted to the SD 2392 (with said translation 2399 described in more detail elsewhere, such as in FIG. 63). Alternatively, in some examples translation of an SD instruction 2390 is required 2391 2399 and said translation is performed at the SD 2391 2399 after said SD instruction 2390 is transmitted to the SD. Alternatively, in some examples translation of SD instruction 2390 is required 2391 2399 and said SD instruction 2390 is transmitted to an SD server or a third-party application or service which performs said translation remotely 2391 2399.

In some examples a CD can utilize said remote control means (such as in some examples a control application, in some examples of viewer application, in some examples both a control application and a viewer application, in some examples a generated remote control interface, in some examples no control or viewer application and no generated remote control interface) to control two or a plurality of SD's simultaneously (as described elsewhere such as in FIG. 56). In some examples a user can select between the plurality of simultaneously controlled SD's the one SD that the user wants to control remotely at a given moment. In some examples a user can select between the plurality of simultaneously controlled SD's the two or a plurality of SD's that the user wants to control remotely at a given moment. In some examples a user can select two or a plurality of remotely controllable SD's to perform a single remote control instruction that corresponds to said selected SD's; such as in some examples to open two or a plurality of SD's simultaneously, in some examples to close two or a plurality of SD's simultaneously, in some examples to start the recording function of two or a plurality of SD's by entering a single remote control instruction; and in some other examples to perform a different but commonly available remote control feature or function with two or a plurality of SD's simultaneously.

In some examples the SD remote control instruction selected 2390 and transmitted 2392 (whether or not translated into an SD command 2391 2399) is received by the SD 2393, where it is utilized to perform the selected instruction 2393. In some examples performing an instruction includes entering a mode 2393; in some examples performing an instruction includes executing a command 2393; in some examples performing an instruction includes running an SD application 2393; performing an instruction includes includes running an SD application 2393 and loading data (or in some examples a data file, or in some examples data attributes or conditions) from said SD or from a remote source; in some examples performing an instruction includes another feature 2393, function 2393, capability 2393, etc. of the remotely controlled SD by known remote control means.

In some examples an SD receives a remote control instruction 2393 and performs it 2393 resulting in a new SD state 2394, SD condition 2394, SD data 2394, etc. In some examples said updated SD state, condition, data, etc. is transmitted to the CD 2394 under automated program control. Alternatively, in some examples an SD 2393 acquires and transmits its updated state 2394 when it receives 2394 when it receives an instruction to do so 2390 that is transmitted by a CD 2390 2391 2399 2392, and is received and executed by an SD 2393 2394.

In some examples said updated and transmitted SD state, condition, data, etc. does not need to be translated to be displayed 2389 and/or utilized 2389 2390 by said CD, so the updated and transmitted SD state, condition, data, etc. are transmitted to the SD 2394 2395 2389. In some examples said updated and transmitted SD state, condition, data, etc. needs to be translated in order to be displayed 2389 and/or utilized 2389 2390 by said CD, therefore in some examples said CD receives 2395 said SD's transmission 2394, determines if translation into a specific CD control application protocol or interface 2389 is required 2395, and performs said translation 2396 (with said translation 2396 described in more detail elsewhere, such as in FIG. 63). In some examples no translation is required 2395 2389 of SD transmitted update(s), while in some examples translation is required 2395 2396 2389, and the SD's updated state, condition, data etc. is utilized to update the CD's control screen 2389 four entering subsequent SD remote control instructions 2390. Alternatively, in some examples translation of SD updates 2394 is required 2395 2396 and said translation is performed at the SD 2395 2396 before said SD updates 2394 are transmitted to the CD. Alternatively, in some examples translation of SD updates 2394 is required 2395 2396 and said SD updates 2394 are transmitted to an SD server or a third-party application or service which performs said translation remotely 2395 2396.

In some examples a CD remains at an SD interface 2389 where the CD's user may enter SD controls or instructions 2390 until the control session is ended 2397 2398, exited 2397 2398, or terminated 2397 2398. In some examples said control session may be ended 2397 2398 in some examples by timing out at the end of a period where an SD is not used; in some examples by being ended under program control when determined by an SD server, an SD service or another source; in some examples by timing out or being terminated when determined by the owner of the SD being used; in some examples at the end of a predetermined block of time such as for the free use of an SD in high demand; in some examples by other preprogrammed criteria; and in some examples by manual command(s).

Translate CD Instructions to SD, and SD Outputs to CD: Turning now to FIG. 63, "RCTP—Translate CD Instructions to an SD, and SD Outputs to CD," in some examples translation is not required for CD instructions to an SD, and in some examples translation is not required for SD outputs to a CD—which provides direct means for remote control of an SD by a CD. In some examples, however, a networked SD capable of control can be managed and controlled by a CD even if said CD does not locally maintain in some examples control applications, and some examples viewer applications, in some examples communication protocols, or in some examples the SD's control instructions for remotely controlling every controllable SD. In some examples translation provides means for one or a plurality of RCTP implementations that may be implemented in one or a plurality of combinations of CDs and SD's.

In some examples a CD's instructions are translated into an SD's commands. Said process starts with a CD's control screen 2402 for remote control of an SD (as described elsewhere). In some examples a CD user enters a remote control instruction 2403 to be transmitted to an SD. In some examples a control instruction 2403 is specific to a unique SD 2410, and in some examples a control instruction 2403 includes identification of the unique SD 2410 under control and its address, such that a CD communicates directly with an SD. In some examples said control instruction 2403 does not need translation 2404 such as in some examples because it is already an SD control command; and said control instruction 2403 is transmitted 2406 directly to said SD 2410 to perform the instruction 2403. In some examples said control instruction 2403 requires translation 2404 2405 which in some examples may be performed by the CD 2401 2418, in some examples may be performed by the SD 2410 2418, in some examples may be performed by an SD server 2418, in some examples may be performed by a TPU server 2418, in some examples may be performed by a third-party SD service 2418, and in some examples may be performed by another application or resource.

Though said translation can be performed 2401 2410 2418 in one of a plurality of apparatuses, applications or services; in some examples the instruction is translated into an industry standard protocol 2401 2410 2418, in some examples the instruction is translated into a proprietary protocol 2401 2410 2418, and in some examples the instruction is translated with a custom integration between the devices 2401 2410 2418. In some examples a device profile is retrieved 2419 from remote storage 2424; in some examples an industry standard protocol is retrieved 2419 from remote storage 2424; in some examples a proprietary protocol is retrieved 2419 from remote storage 2424; in some examples a custom integration between the devices is retrieved 2419 from remote storage 2424; in some examples a list of SD specific commands is retrieved 2419 from remote storage 2424; in some examples a control application is retrieved 2419 from remote storage 2424 that contains the SD's commands; and in some examples other means are used to retrieve 2419 the SD's specific commands 2424. In some examples the control instruction 2403 is translated into an industry standard protocol instruction 2419 that corresponds to that SD; in some examples the control instruction 2403 is translated into a proprietary SD-specific protocol instruction 2419 that corresponds to that SD; and in some examples the control instruction 2403 is translated into an SD-specific command 2419 that corresponds to that device or model.

In some examples a translation 2419 does not succeed and in some examples a protocol is generated 2420 (as described elsewhere, such as in FIG. 59), which in some examples retrieves a uniform standard protocol that is used to generate a protocol (named a "generated protocol"), and thereby determine an instruction 2403 2404 2405 2406 that corresponds to that SD 2410. In some examples a translation 2419 does not succeed and a protocol is not generated 2420, and in some examples a subset of device commands is utilized 2421 rather than a complete set of device commands (as described elsewhere, such as in FIGS. 59 and 60), and thereby determine an instruction 2403 2404 2405 2406 that corresponds to that SD 2410. In some examples a translation 2419 does not succeed, a protocol is not generated 2420, and a subset of device commands is utilized 2421 and other known means 2422 are utilized, and thereby determine an instruction 2403 2404 2405 2406 that corresponds to that SD 2410. In some examples a subset of device commands can be utilized 2421 such as an SD 2410 that is capable of features, functions and/or attributes not included in the retrieved 2424 device profile, industry-standard protocol, proprietary protocol, custom integration, list of SD specific commands, control application with SD's commands, etc.—and in these examples one or a plurality of defaults can be set 2404 2405 2419 2420 (with or without default attributes). In some examples translation processing fails 2418 2419 2420 2421 2422 2424 and in that case AKM steps are employed 2423 (as described elsewhere); if said AKM steps succeed 2423 then the resulting SD instruction or SD command is used 2405 2406 and remote control proceeds 2410; but if said AKM steps fail 2423 then the AKM error process initiates 2423, and an appropriately worded error message is displayed to the CD user 2425.

In some examples the SD control command 2406 is transmitted to the SD 2406. In some examples the SD control command 2406 is transmitted as one individual instruction 2406 and in some examples the SD control command 2406 is a mass transmission of a plurality of instructions 2406 in the order entered by the CD's user. In some examples the SD remote control instruction transmitted 2406 (whether or not translated into an SD command 2404 2405 2418) is received by the SD 2410 2411, where it is utilized to perform the selected instruction 2411 (as described elsewhere). In some examples said SD command is performed successfully 2412 resulting in a new SD state 2414, SD condition 2414, SD data 2414, etc. (as described elsewhere). In some examples said SD command is not performed successfully 2412 and in this case an (optional) step is for the SD to attempt translation of the SD command received into an SD command that can be performed 2418 2419 2420 2421 2422 2424 2411. Alternatively, in some examples said SD command is not performed successfully 2412 and in this case an (optional) step is to notify the CD 2425 2401 so that it may attempt to re-enter the SD remote control instruction 2403 and re-translate the SD instruction 2418 2419 2420 2421 2422 2424 2411 (whether said re-translation is processed locally by the CD 2401 2418 or remotely by an SD server 2418 or another remote resource 2418) into an SD command that can be transmitted and performed 2406 2411.

In some examples the output from the new SD state, SD condition, SD data, etc. (herein "SD update") is compatible with the CD's remote control 2413 2402 and said SD update is transmitted to the CD 2414. In some examples the output from the SD update is not compatible with the CD's remote control 2413 2402 and in this case an (optional) step is to attempt translation of the SD update data into SD data that is compatible with the CD's remote control 2418 2419 2420 2421 2422 2424 2414 2402. In some examples said SD update is translated into an industry-standard protocol 2419 (as described elsewhere); in some examples said SD update is translated into a proprietary protocol 2419 (as described elsewhere); in some examples said SD update is translated with a custom integration between the devices 2419 (as described elsewhere); in some examples said SD update is translated with a generated protocol 2420 (as described elsewhere); in some examples said update is translated with a subset of device commands 2421 (as described elsewhere); and in some examples said update is translated by other known means 2422 (as described elsewhere). Alternatively, in some examples the output from the SD update is not compatible with the CD's remote control 2413 2402 and in this case an (optional) step is to transmit the incompatible SD update data 2414 to the CD 2401 2402 where it may be re-translated 2418 2419 2420 2421 2422 2424 2414 2402 (whether said re-translation is processed locally by the CD 2401 2418 or remotely via an SD server 2418 or another remote resource 2418) into compatible SD update data that may be utilized by the CD 2402 2403.

In some examples when translation is utilized the protocol used to translate the CD's remote control instructions into SD commands 2405 2418 2406 2411 is the same protocol that is used to translate the SD's update data for use by the CD's control screen 2413 2418 2414 2402. In some examples when translation is utilized different protocols are used; that is, one protocol is used to translate the CD's remote control instructions into SD commands 2405 2418 2406 2411 while a different protocol is used to translate the SD's update data for use by the CD's control screen 2413 2418 2414 2402.

VIRTUAL TELEPORTAL (VTP)—Virtual Teleportals on AIDs/AODs: Virtual Teleportals (VTPs) run on one or a plurality of AIDs/AODs (Alternative Input Devices/Alternative Output Devices, which are networked electronic devices as described elsewhere) that can't directly become a Teleportal, but have the capacity to run a VTP application or a web browser application that emulates one or a plurality of functions of a Teleportal. Depending on each device's capabilities they may also be able to use a VTP for other functions such as in some examples RCTP control of subsidiary devices.

In some examples VTPs may be considered as providing the opposite functionality to RCTP (Remote Control Teleportaling). RCTP enables TP devices to control subsidiary devices, while a VTP runs on one or a plurality of networked electronic devices to enable them to provide Teleportal functionality by connecting to and controlling TP devices. VIP's provide additional means for today's blizzard of new and complex networked electronic devices to utilize the Teleportals' ARTPM and their digital realities. This expands the overall productivity and value of a plurality of types of networked electronic devices by providing means to perform more functions at lower cost, without needing to buy additional devices than those that are already owned. (In some examples, however, these networked electronic devices, herein called AIDs/AODs, may directly run Teleportal features and functions, and when they do so, they substitute for TP devices.)

Figure 64:
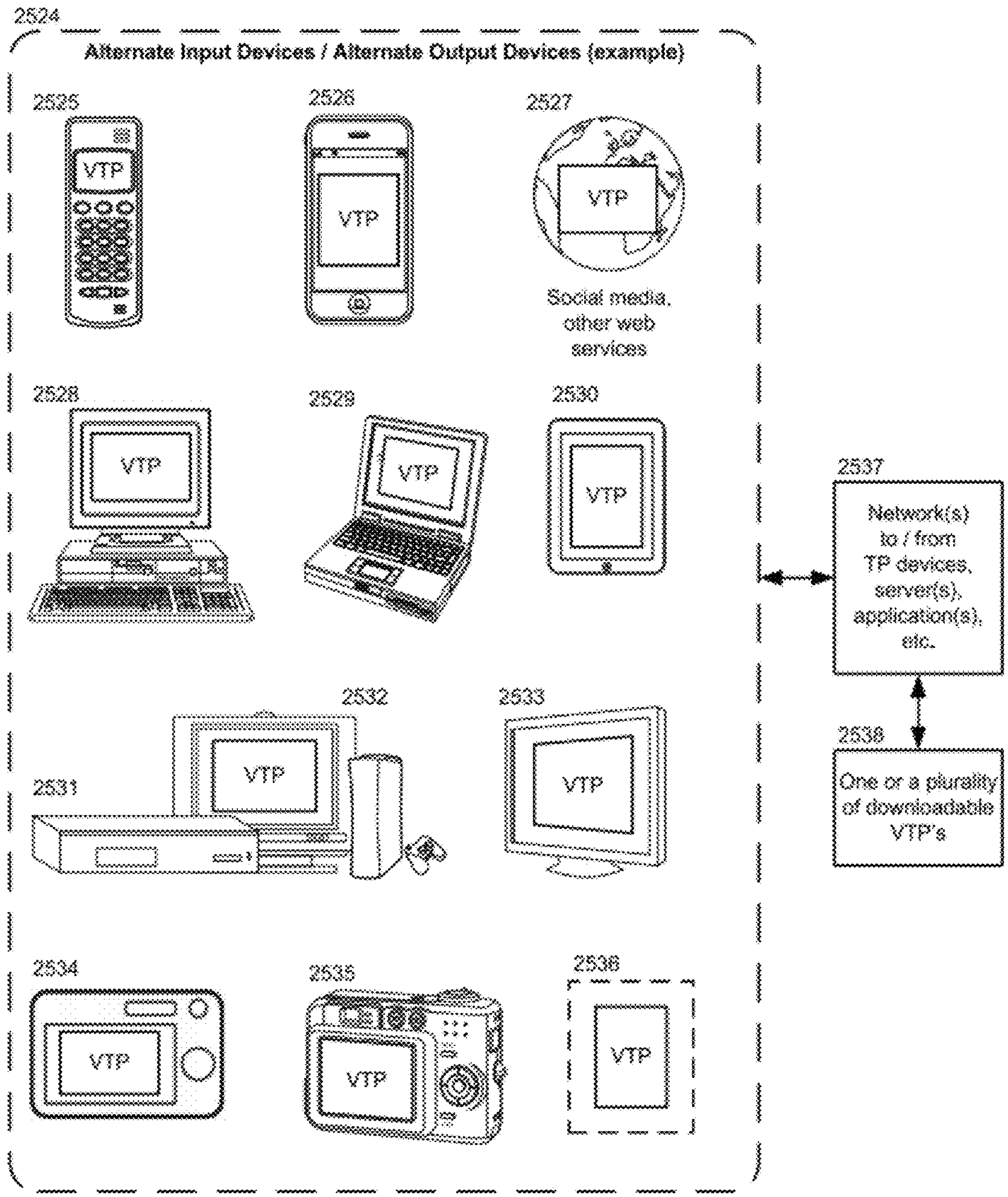
FIG. 64 is a pictorial diagram that illustrates some examples of a Virtual Teleportal (VTP) on a plurality of Alternate Input Devices/Alternate Output Devices (AIDs/AODs).

FIG. 64, "Virtual Teleportals on AIDs/AODs": Some examples of Alternate Input Devices/Alternate Output Devices (AIDs/AODs) are illustrated in FIG. 64 as well as described elsewhere, which includes in some examples mobile phones, in some examples Web services such as social media and other Web services that enable applications, in some examples personal computers, in some examples laptop computers, in some examples netbooks, in some examples electronic tablets or e-pads, in some examples DVR's (digital video recorders), in some examples set-top boxes for cable television or satellite television, in some examples networked game systems, in some examples networked televisions, in some examples networked digital cameras that have the added ability to download and run applets, and in some examples other types of networked electronic devices. In some examples AIDs/AODs communicate by various means over one or a plurality of disparate networks to TP devices (as described elsewhere).

Figure 65:
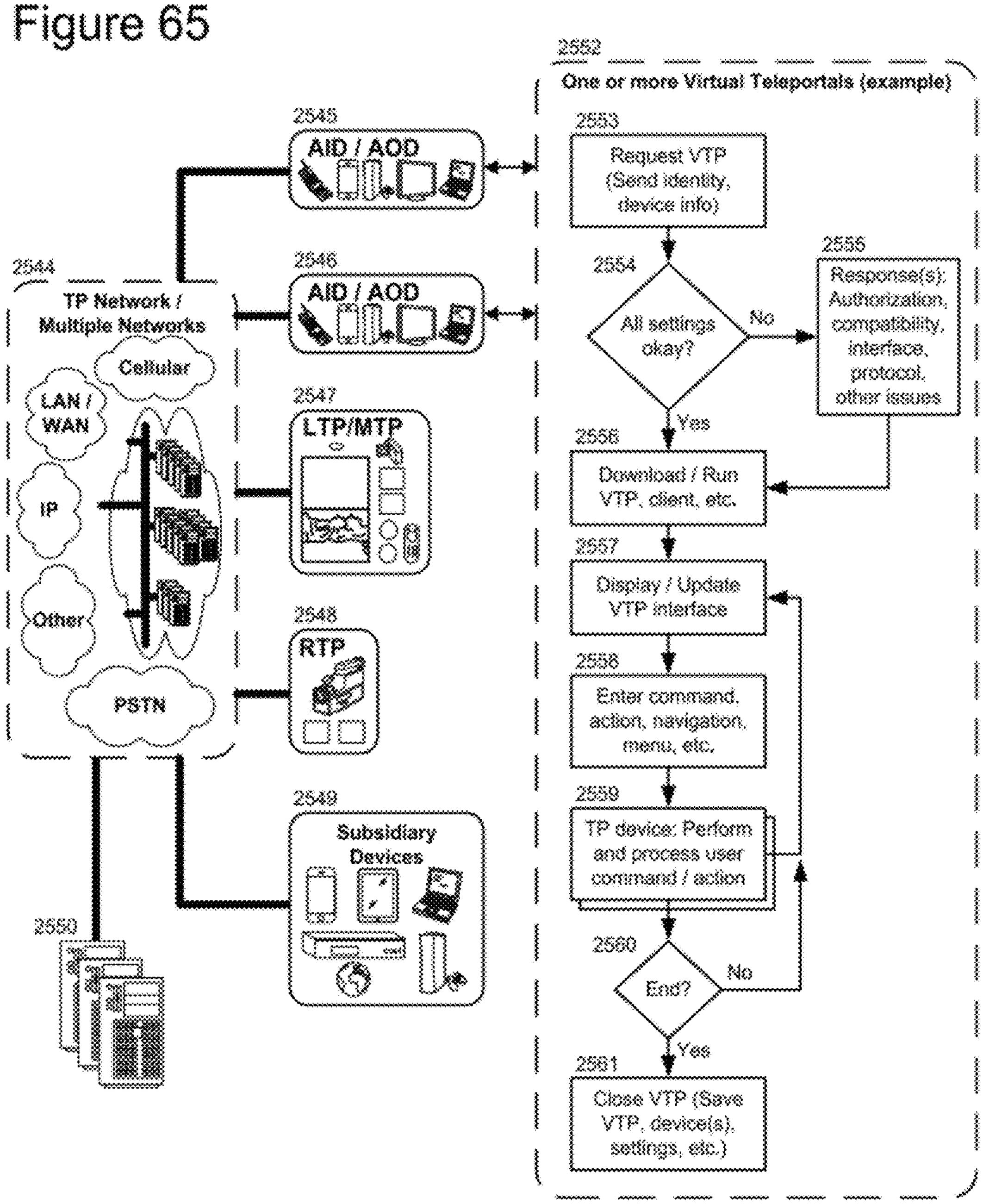
FIG. 65 is a pictorial block diagram that illustrates some examples of VTP processing on AIDs/AODs.
Figure 66A:
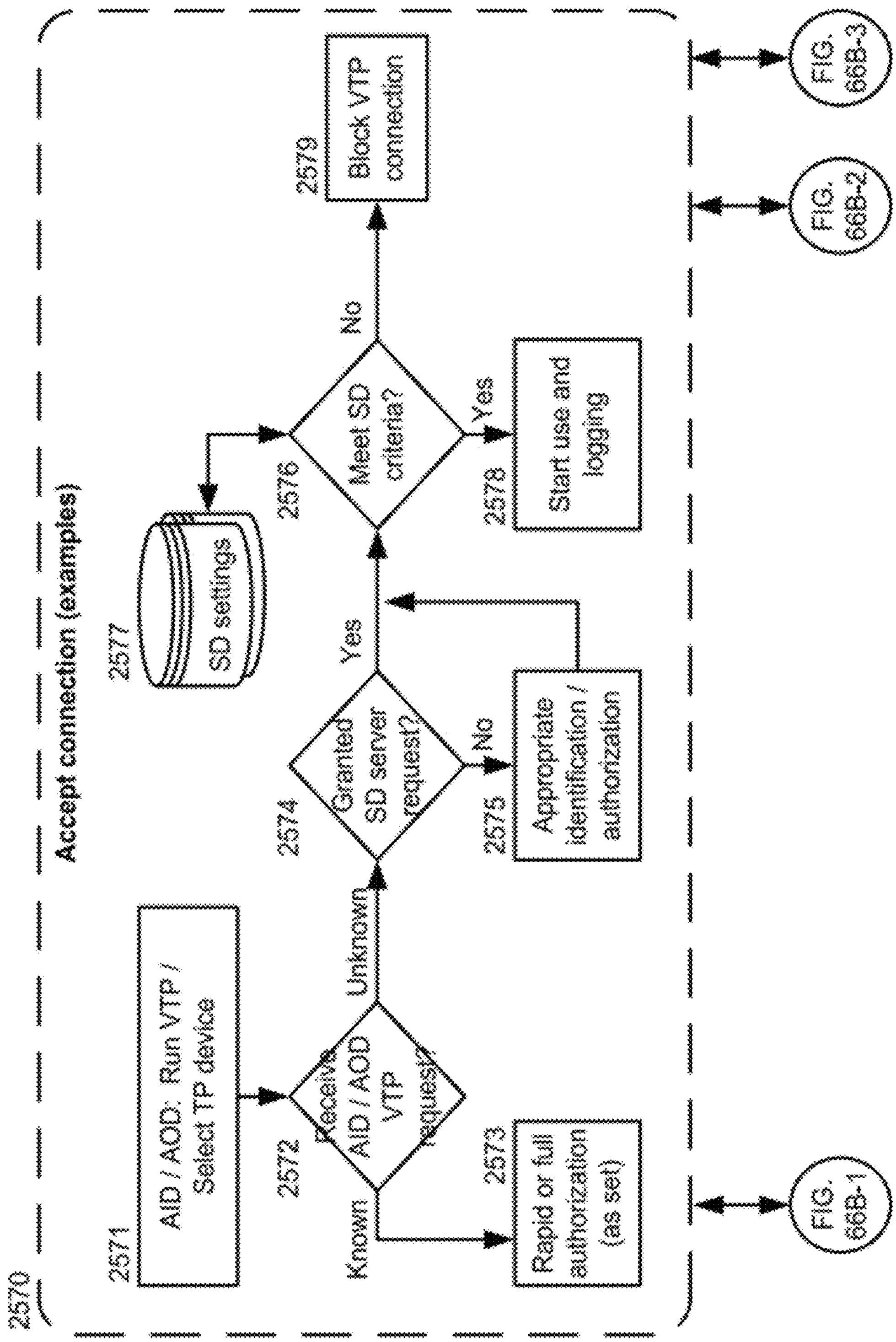
FIG. 66 is a flow chart and pictorial diagram showing some examples of initiating VTP connections with TP devices.
Figure 66B:
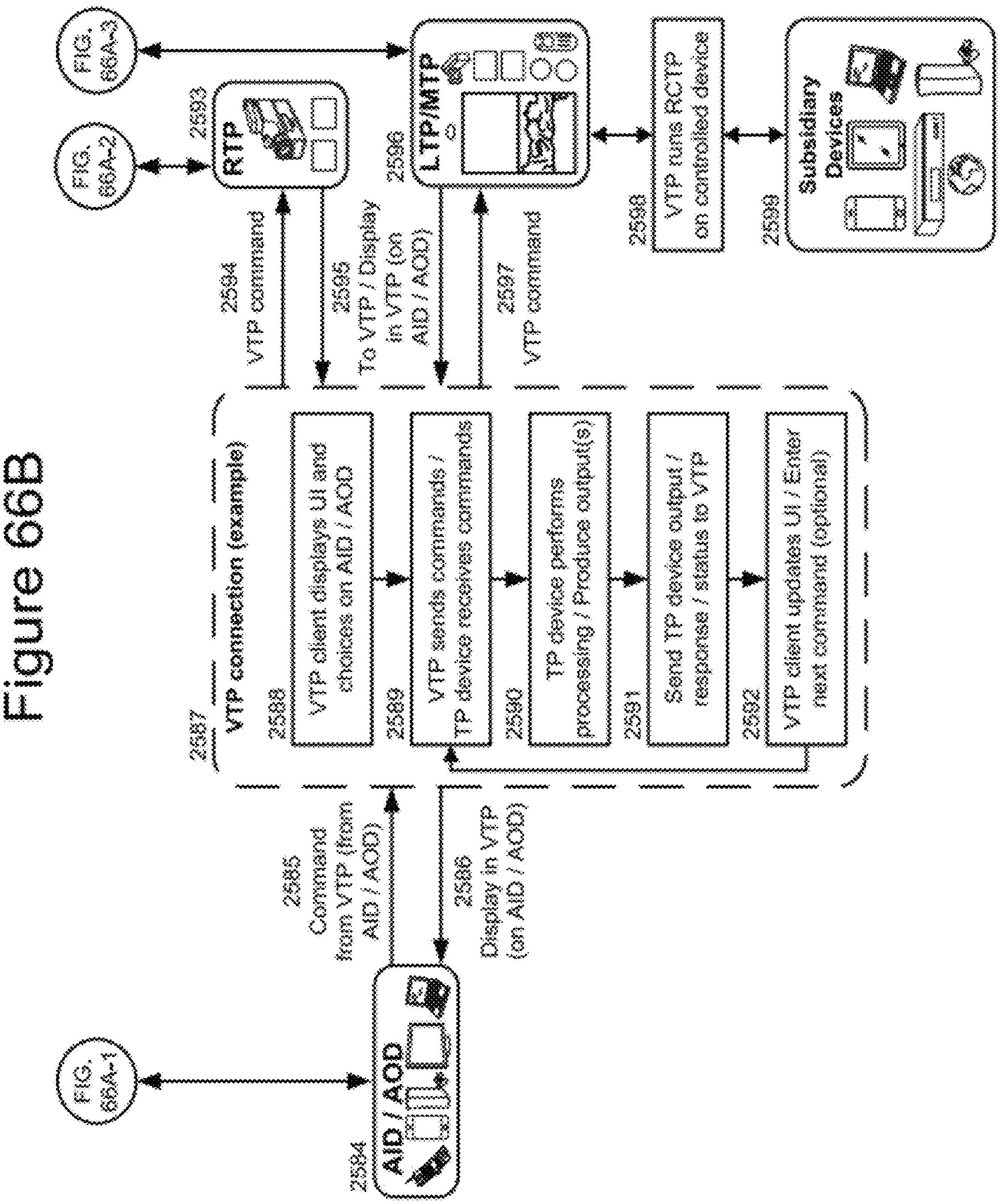
Figure 67A:
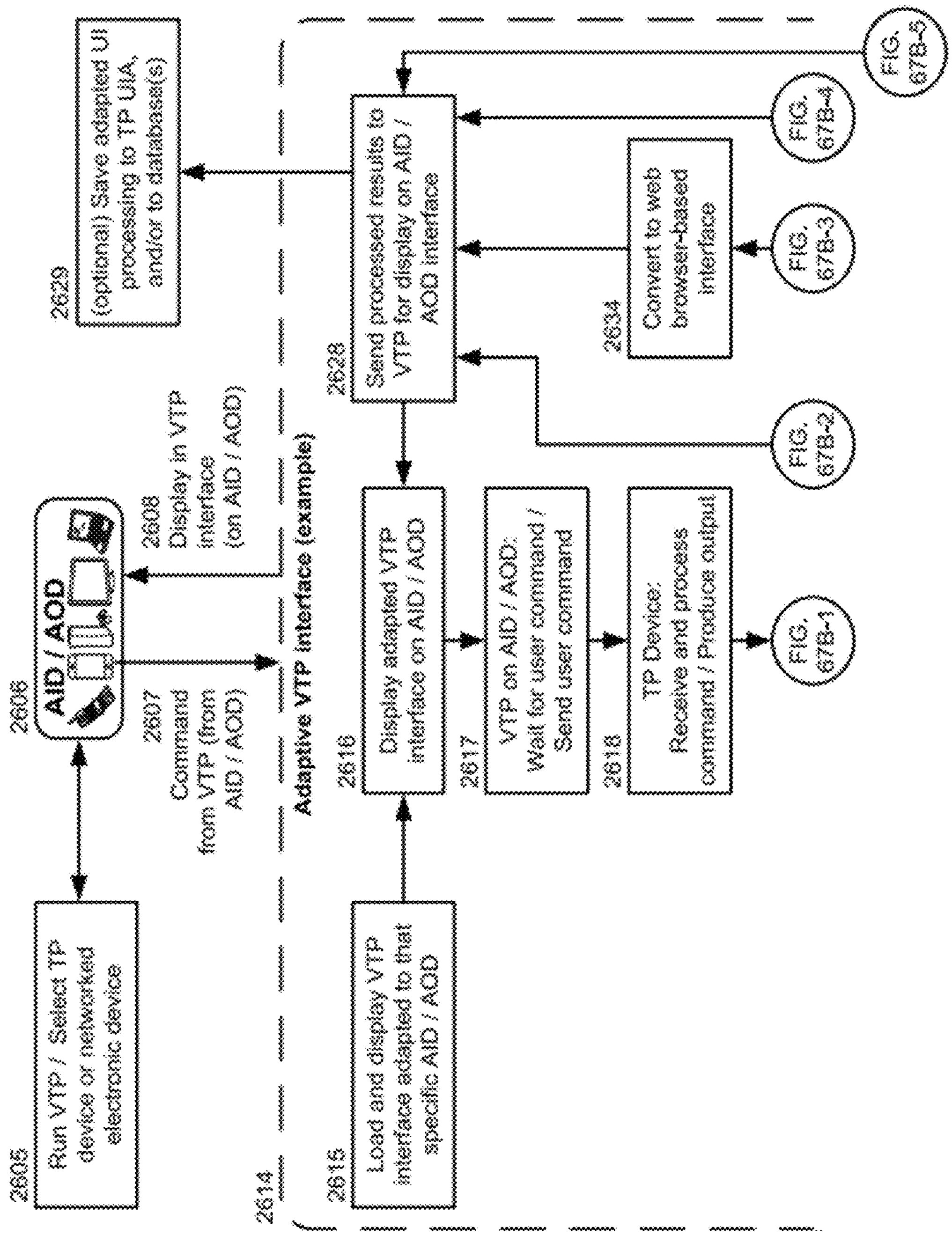
FIG. 67 is a flow chart showing some examples of procedures for VTP processing on TP devices.
Figure 67B:
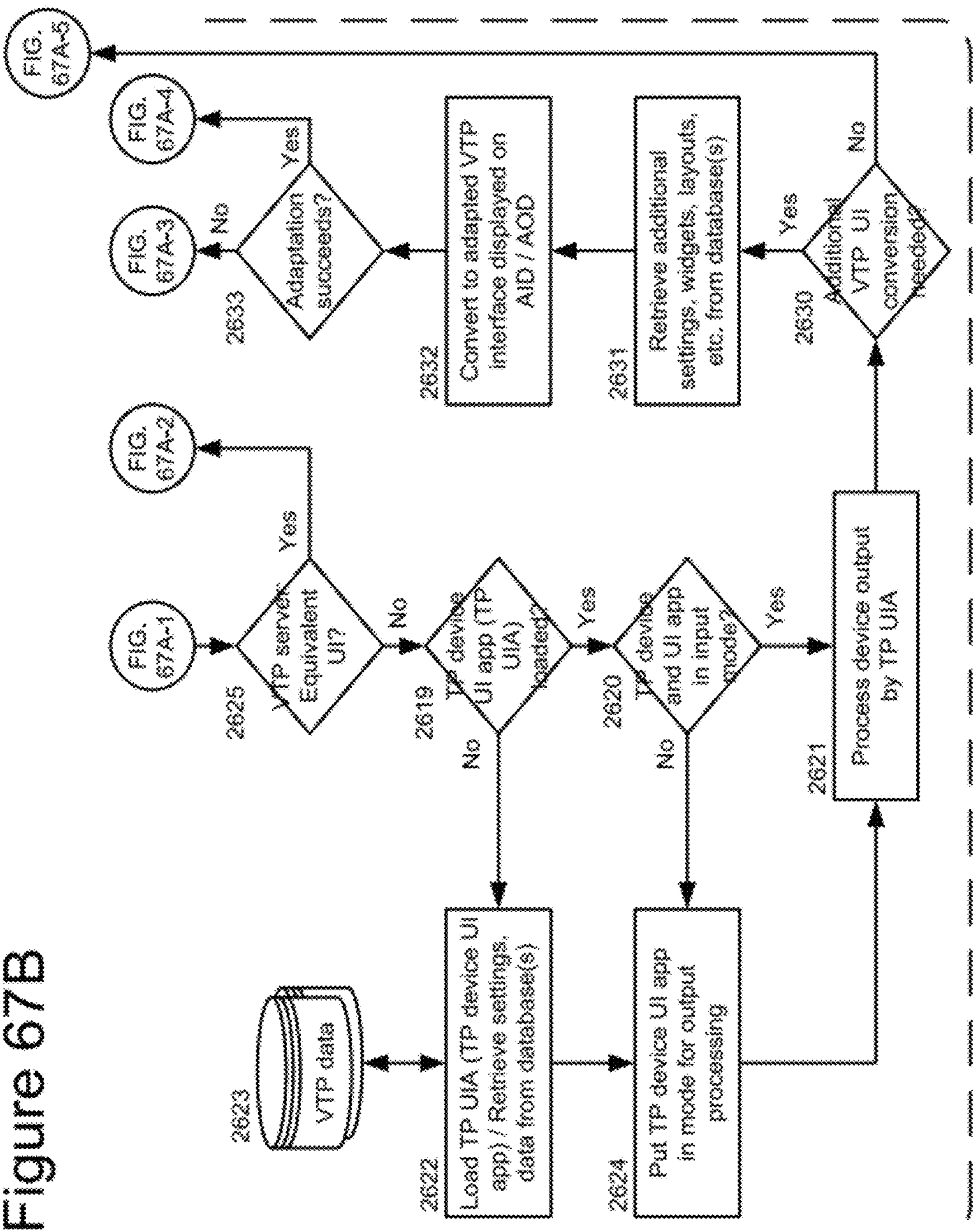

Together, FIG. 65, "VTP Processing (AIDs/AODs)" and FIG. 66, "VTP Connections with TP Devices" and FIG. 67, "VTP Processing on TP Devices" comprise a system, method and/or process whereby a user of an AID/AOD runs a VTP client that in some examples enables the selection of a TP device from one or a plurality of TP devices; and in some examples connects to a requested TP device (with optional security protection such as login, authentication, authorization, etc.). In some examples an AID/AOD running a VTP client may select and connect to a TP device directly, and in some examples connect to a TP device by means such as an SD server or a similar facility that provides access to a plurality of TP devices of various types and configurations, each with a plurality of different types of tools and/or resources (such as in some examples applications, in some examples digital content, in some examples services, and in some examples other types of resources), so that a specific AID/AOD may establish a VTP connection with one of a plurality of selectable TP devices. In some examples the requested TP device runs a VTP server (which may include one or a plurality of virtual machines) on said connected TP device that generates an appropriate VTP client interface (which may optionally be an adapted interface), wherein the VTP server transmits the VTP interface to the VTP client. In some examples the VTP client receives an appropriate TP device interface (which may optionally be an adapted interface) that is displayed on the AID/AOD (where "display" includes any and all media capabilities of the AID/AOD such as video and/or audio); in some examples the VTP client interface enables the user of the AID/AOD to act on the TP device (by means of the VTP client interface which may include means such as a pointing device, keyboard input, clicking, touching or tapping, voice input, etc.) to issue a command or provide input or data; and in some examples the VTP client monitors the VTP client interface for user actions and transmits command(s) and/or input(s) to the VTP server that is running on a TP device. In some examples the VTP server receives VTP client command(s) and/or input(s) (and may optionally determine the appropriate TP device processing to perform if command translation[s] is required), and passes said user command(s) (or a series of commands) with their associated input (s) to the TP device to execute the commands and perform the required actions. In some examples the VTP server receives TP device processed output(s) and formats and transmits it to the VTP client for display; and in some examples the VTP server adapts the TP device processed output(s) to provide an adapted interface for display by the VTP client on a specific AID/AOD. In some examples the VTP client monitors subsequent VTP client interface interactions for user actions that require additional TP device processing, which continues the above described process until it is terminated and/or exited.

In some examples this parallels known uses of a client and server system that utilize a single server to facilitate the simultaneous use of a plurality of clients. In some examples an AID/AOD may run one or a plurality of VIP's; in some examples a TP device may run one or a plurality of VTP servers; in some examples a VTP server may run a plurality of virtual machines that each support a separate AID/AOD and each virtual machine may execute a process that adapts the TP device's output to each specific AID/AOD. In some examples one or a plurality of VTP(s), one or a plurality of VTP server (s) and one or a plurality of TP UTA instances may combine to enable one or a plurality of AIDs/AODs to simultaneously receive adaptive interfaces while controlling and/or using one or a plurality of TP devices such as in some examples one-to-one (one AID/AOD to one TP device); in some examples many-to-one (a plurality of AIDs/AODs to one TP device); in some examples one-to-many (one AID/AOD to a plurality of TP devices); and in some examples many-to-many (a plurality of AIDs/AODs to a plurality of TP devices).

In some examples a TP device's output can be both adapted to a specific AID/AOD and also modified by means of additional post-processing such as in some examples utilizing post-processing to add advertising or other marketing messages; in some examples utilizing post-processing to blend in the appearance of a new person or object (such as a logo, a business building, a sign or another marketing image); in some examples utilizing post-processing to remove a person or object (such as a logo or marketing image); in some examples utilizing post—processing to change the behavior of an interface component such as a widget or a link (such as in some examples altering which vendor's online store receives a user's purchase selection); in some examples utilizing post—processing to make a combination of changes such as replacing displayed advertisements and changing the online store visited by any remaining advertisements; and in some examples performing other transformations.

Turning now to FIG. 64, "Virtual Teleportals on AIDs/AODs," some examples 2524 are illustrated of Alternate Input Devices/Alternate Output Devices (AIDs/AODs) which in some examples include wired and/or wireless networked electronic devices such as in some examples mobile phones 2525 2526, in some examples Web services such as social media and other Web services that enable applications 2527, in some examples personal computers 2528, in some examples laptops 2529, in some examples netbooks, in some examples electronic tablets or pads 2530, in some examples DVR's (digital video recorders) 2531, in some examples set-top boxes for cable television 2531 or satellite television 2531, in some examples networked game systems 2532, in some examples networked televisions 2533, in some examples networked digital cameras that have the added ability to download and run applets 2534 2535 (such as is already common for camera enabled smart phones and camera enabled electronic pads), in some examples other types of networked electronic devices 2536 such as wearable electronic devices, servers, etc.

In some examples a communications link may include any means of transferring data such as in some examples a LAN 2537, in some examples a WAN 2537, in some examples a TPN (Teleportal Network) 2537, in some examples an IP network (such as the Internet) 2537, in some examples a PSTN (Public Switched Telephone Network) 2537, in some examples a cellular radio network 2537, in some examples an ISDN (Integrated Services Data Network) 2537, and in some examples another type network. In some examples an example task might include turning on one of these devices 2524 2525 2526 2527 2528 2529 2530 2531 2532 2533 2534 2535 2536, such as connecting it to a network 2537 and downloading a VTP 2538 and running a VTP 2538, including in some examples storing the downloaded VTP 2538 in the device's local storage for faster future use by that networked electronic device 2525 2526 2527 2528 2529 2530 2531 2532 2533 2534 2535 2536.

VTP Processing (AIDs/AODs): Turning now to FIG. 65, "VTP Processing (AIDs/AODs)," in some examples one or a plurality of AIDs/AODs 2545 2546 may connect by one or a plurality of disparate networks 2544 with TP devices such as in some examples one or a plurality of LTP's 2547; in some examples one or a plurality of MTP's 2547; in some examples one or a plurality of RTP's 2548; in some examples one or a plurality of another type of networked electronic device 2550 (as described elsewhere); and in some examples to utilize an RCTP on an LTP 2547 or an MTP 2547, selecting and controlling one or a plurality of subsidiary devices 2549.

In some examples a VTP 2552 comprises a VTP server that runs on a TP device (such as in some examples an LTP 2547, in some examples an MTP 2547, and in some examples an RTP 2548) or in some examples runs on another type of networked electronic device (such as a TP Server 2550, Teleportal Utility, Teleportal Network Service, Web server 2550, Web service 2550, or other external means configured to provide Teleportal functions); a VTP client runs on one or a plurality of AIDs/AODs 2545 2546 (such as in some examples an application running within a web browser 2552, in some examples a downloadable application 2552, in some examples a purchased software application 2552 [e.g., an unmodifiable or customizable software product] that is sold by one or a plurality of vendors; in some examples an applet 2552, in some examples a component within an application 2552, in some examples a module within an application 2552, in some examples a browser-based interface to a web service 2552, in some examples a code-generated user interface and control application 2552, and in some examples known means other than illustrated herein); that are coupled by one or a plurality of disparate networks 2554 (such as in some examples the Internet 2544, in some examples a local area network 2544, in some examples a wide area network 2544, in some examples the public switched telephone network 2544, in some examples a cellular network 2544, and in some examples another type of wired and/or wireless network).

In some examples a VTP server is coupled to TP processing (as described elsewhere) performed by a TP device, by means of a TP command processing component that translates information from a VTP client into TP processing performed by a TP device; in some examples the output from said TP processing is processed for display by a VTP client by TP processing means as described elsewhere; and in some examples the TP command processing component transfers information in both directions between a TP device's network interface such as providing commands to TP processing as well as providing display output from TP output processing for VTP client display. In some examples a VTP server serves the needs or requests of one or a plurality of VTP clients, and may be instantiated in some examples as software, in some examples as hardware, in some examples as a software/hardware system or subsystem, in some examples as a specialized device such as a rack-mounted VTP server; and just as other servers do a VTP server may utilize any known form of technology or programming to provide services to clients.

In some examples a VTP client includes an information client (such as in some examples a web browser and in some examples other means as described elsewhere) capable of requesting 2553 and receiving a VTP app/applet 2553 from a VTP server or from another network-accessible source of VTP apps/applets, or from another accessible storage means. In some examples that information client provides sufficient identification of the requesting AID/AOD 2553 and (optionally) sufficient identification of the requesting user's identity 2553 so that the appropriate VTP app/applet may be selected (as described elsewhere such as in some examples FIG. 183 through FIG. 187) and downloaded to the AID/AOD. In some examples prior to download one or a plurality of validation(s) are performed 2554 such as in some examples identity authorization 2555, device compatibility with that specific VTP 2555, device capabilities such as its display interface 2555, communications protocol 2555, and/or other validations 2555. In some examples upon download 2556 and initial execution 2556 one or a plurality of validation(s) are performed 2554 2555. In some examples upon execution 2556 that information client defines a virtual machine environment that is hardware independent and operating system independent. In some examples the VTP client executes the downloaded VTP app/applet 2557 within its defined virtual machine environment to configure that AID/AOD as a "TP device controller" that connects over the network with a VTP server, and communicates over the network to send commands 2558 to the VTP server's TP command processing component 2559 and receive display output from it 2557 by means of those communications. In one example a VTP applet may be Java programming language code and the virtual machine environment can be created within a Java-enabled web browser.

In some examples a user employs a VTP client on an AID/AOD 2557 to enter commands 2558 (e.g., requests for service) that are transmitted over the network to a VTP server where a TP command processing component 2559 translates those commands into TP processing by a TP device or similar means 2559; and in some examples the TP device responds to those commands 2559 as described elsewhere; and in some examples the TP command processing component transfers back over the network, to the VTP client, the resulting display output from TP output processing for display by the VTP client 2557. In some examples a VTP client generates commands for monitoring 2558 in some examples a TP device 2559, in some examples an SPLS 2559, in some examples a focused connection 2559, and in some examples another process that a TP device performs 2559. In some examples a TP device responds to selected commands 2559 from a VTP client 2558 received over the network by a VTP server and continuously transfers the resulting output over the network back to the VTP client 2557. In one example a VTP client requests a focused connection with one of an SPLS's IPTR, such as with a specific identity, the TP device opens that focused connection and continuously updates that connection on the AID/AOD by means of its VTP server and the VTP client. In some examples alternative means may be employed such as process control in which a VTP client Java applet generates a message or command 2557 to a VTP server that includes an object manager that responds to the message or command 2558, and invokes a method that controls a process 2558 and/or monitors a process 2558 in a TP device, and provides an updated display for the VTP client 2557.

In some examples the VTP client and VTP server process remain open and connected unless manually ended 2560 2561, and in some examples the VTP client and VTP server process automatically end 2560 2561 after a timeout or other pre-specified ending trigger (and in some examples that automated ending trigger[s] 2560 may be edited and saved). In some examples if a VTP client is ended 2560 2561, exited 2560 2561 or terminated 2560 2561 that VTP client and its settings may be saved to a local AID/AOD device, which will provide faster and more direct VTP uses in the future.

In some examples another alternative may be to enable one VTP server on one TP device to support a plurality of AID/AODs simultaneously while they each run a separate VTP client. In other words, in some examples a plurality of AIDs/AODs 2545 2546 simultaneously each run a VTP client 2556 that together communicate with one VTP server that in turn utilizes 2557 2558 a single TP device's 2547 2548 2550 processing 2559, functions 2559, capabilities 2559, and outputs 2559 2557 to simultaneously support a plurality of separate VTP clients 2556 2557 2558, with each VTP client on one of a plurality of AIDs/AODs 2545 2546.

In some examples this parallels known uses of a client and server system that utilizes a single server to facilitate the simultaneous use of a plurality of clients. In one example of this a VTP server on a single TP device may enable multiple virtual machines 2559 in which each virtual machine contains a TP command processing component 2559 that translates the commands from one VTP client into TP processing by the TP device 2559; and in some examples the TP device responds separately to the commands 2559 from each one virtual machine in a VTP server; and in some examples the resulting display output from TP output processing of that one virtual machine's commands are transferred back over the network to the appropriate single VTP client, for display by that VTP client 2557 on its AID/AOD.

In some examples a VTP server has multiple virtual machines 2559 contained within, with each virtual machine capable of being connected to by one VTP client 2556 2557 2558 running on one AID/AOD. In some examples a user of a first AID/AOD runs a VTP client 2556 that has been previously downloaded and configured, which in turn communicates over one or a plurality of disparate networks and connects to a first virtual machine 2559 running on a TP device's VTP server. In some examples the user of that first AID/AOD employs its VTP client 2557 interface and the I/O means of that AID/AOD (such as in some examples mouse clicks, in some examples keyboard input, in some examples touch screen, in some examples voice recognition, and in some examples any other user I/O means) to input commands 2558, data 2558, etc. that are communicated to its respective virtual machine 2559 on a VTP server. In some examples the first virtual machine in the VTP server receives data from that first AID's/AOD's VTP client which is then processed by the TP device (as described elsewhere). In some examples a single refreshed display is produced by the TP device which the first virtual machine 2559 in the VTP server communicates to the VTP client in the first AID/AOD to update and refresh its display 2557; in some examples continuously updated video and audio are produced by the TP device which the first virtual machine 2559 in the VTP server communicates continuously to the VTP client in the first AID/AOD to continuously update the display of its video and the playing of its audio 2557; and in some examples other TP device processing may be output (such as in some examples bitmaps, in some examples images, in some examples user interface screens or component(s) of an interface screen(s), in some examples files, in some examples commands, in some examples other types or formats of data) which the first virtual machine 2559 in the VTP server communicates to the VTP client 2557 in the first AID/AOD for delivery to the user and/or for use by the user.

In some examples a second VTP client 2556 2557 2558 simultaneously interacts with one VTP server that runs a plurality of virtual machines 2559 within it, so that said second VTP client 2556 2557 2558 interacts with a second dedicated virtual machine 2559 within the VTP server. In some examples a plurality of VTP clients 2556 2557 2558 simultaneously interact with one VTP server that runs a plurality of virtual machines 2559 within it, so that each VTP client 2556 2557 2558 interacts with one dedicated virtual machine 2559 within the VTP server. In some examples by implementing a plurality of virtual machines 2559 that each correspond to one VTP client 2556 2557 2558, a single VTP server facilitates Teleportaling and TP device use by a plurality of AID/AOD users.

In some examples a TP device 2547 2548 may run a separate VTP server 2559 for each VTP 2553 2556 2557 that connects to it, with each VTP server capable of being connected to by one VTP client 2556 2557 2558 running on one AID/AOD 2545 2546. Therefore, a plurality of VTP clients 2556 2557 2558 on a plurality of AIDs/AODs 2545 2546 simultaneously interact with one TP device 2547 2548 that runs a plurality of VTP servers 2559 within it, so that each VTP client 2556 2557 2558 interacts with one dedicated VTP server 2559 within the TP device. In some examples by implementing a plurality of VTP servers 2559 that each correspond to one VTP client 2556 2557 2558, a single TP device facilitates Teleportaling and TP device use by a plurality of AID/AOD users.

In some examples a TP device 2547 2548 runs one or a plurality of VTP servers 2559 where each VTP server runs one or a plurality of virtual machines 2559 within it, so that each VTP server 2559 may interact with one or a plurality of VTP clients 2556 2557 2558. Therefore, in some examples a plurality of VTP clients 2556 2557 2558 simultaneously interact with a plurality of VTP servers on a single TP device 2547 2548 by means of a plurality of virtual machines 2559 within said VTP servers, so that each VTP client 2556 2557 2558 interacts with one dedicated virtual machine 2559 within the plurality of VTP servers. In some examples by implementing a plurality of VTP servers wherein each may run a plurality of virtual machines 2559 that each correspond to one VTP client 2556 2557 2558, a single TP device facilitates Teleportaling and TP device use by a plurality of AID/AOD users.

In some examples a VTP server connected to a network receives the output from TP output processing and compresses it before communicating it over a network to a VTP client; in some examples that VTP client receives and decompresses the data received from the VTP server; in some examples a VTP client compresses its data before communicating it over a network to a VTP server; and in some examples one or a plurality of known means for compressing and decompressing said data are utilized.

In some examples the output display area of a Teleportal is larger than the smaller screen size of a specific AID/AOD, and in such a case that VTP client sends specific data of the currently displayed area on the AID/AOD (the portion displayed with respect to the full output display area of a Teleportal) to the virtual machine in the VTP server; in such a case the virtual machine in the VTP server prioritizes the order of the visual display blocks communicated (such as in some examples first communicating the currently displayable area of the AID/AOD so that it is received and displayed first, in some examples second communicating the TP output display areas immediately adjacent to the currently displayed area of the AID/AOD so said adjacent areas are rapidly available in the event a user wants to scroll in any direction, and in some examples third communicating the remaining TP output display areas) so that the current area where a user is viewing is updated first. In some examples continuous video and audio are output by a TP device (such as in some examples from a focused connection, in some examples from a constructed digital reality, in some examples from a TPDP event, and in some examples from another TP process that provides continuous real-time data), and in that case the communication priority is to continuously update the displayed AID/AOD screen so that the available processing and bandwidth is focused on the current area and real-time interaction(s) viewed and/or listened to by a user.

In some examples a VTP client sends a command or other data and in such a case that is given priority over other communications such that the command is executed immediately before other operations and/or communications are continued, so that a dedicated virtual machine in a VTP server provides rapid responses to user commands. In some examples a VTP client issues a command that changes what will be displayed on the AID/AOD, and that in turn interrupts and ends any video and/or audio that are being sent by a VTP server, so that available processing and other resources, and available network bandwidth, may be directed to responding to said VTP client's command with the fastest speed available.

In some examples others alternatives for downloading a VTP may include in some examples detecting the presence of one or a plurality of local devices that may be controlled as a user moves into their proximity so that VTP control may be essentially transparent and in some examples "always on" (with such connectivity as described elsewhere such as with a TP URCI [Universal Remote Control Interface]); in some examples an AID/AOD with one or a plurality of VTP's may store one or a plurality of identifiers for controllable devices for which it has already downloaded and set up VTP control, and in such a case executing a specific device's VTP may prompt a user for authentication or credentials prior to taking remote control; in some examples an AID/AOD with one or a plurality of VTP's may store one or a plurality of identifiers for controllable devices for which it has already downloaded and set up VTP control, and in such a case automatically acquire remote control for one or a plurality of VTP controllable devices when a specific device's VTP is executed; in some examples a device may store one or a plurality of VIP's for controlling it and may download the appropriate VTP when requested by an authorized identity; in some examples when a device downloads an appropriate VTP to an AID/AOD for controlling it, it may initiate an authentication and authorization process to confirm and validate the identity of the user who is taking control; in some examples when a device downloads an appropriate VTP and authenticates the user who has taken control, that authorization may be saved and stored for future rapid re-use in the device in some examples and in the VTP on the AID/AOD in some examples.

In some examples to select a specific device's (AID's/AOD's) VTP in some examples an AID/AOD may transmit its type of device including data such as its manufacturer, model name, model number, etc.; in some examples a user may manually provide one or a plurality of data items such as in some examples a device's manufacturer, in some examples a device's model number, in some examples other device-specific data; in some examples to select a specific device's VTP a user may select a type of controllable device at a high level such as by choosing an icon or a name on a list, and that may automatically transmit sufficient device data, such as a model number to in some examples remote storage and in some examples directly to a device, sufficient to select and download the corresponding and appropriate VTP to the requesting AID/AOD; in some examples remote storage may store one or a plurality of VTP's for controlling one or a plurality of remote devices, and it may download an appropriate VTP for a specific AID/AOD to take control of the specific type controllable device it specifies; in some examples an AID/AOD is configured to display a pick list of controllable devices in some examples directly and in some examples by running a stub application; in some examples an AID/AOD may access a server through a network to download a pick list of controllable devices; in some examples a pick list of controllable devices includes a hierarchical list of manufacturers and models; in some examples when a controllable device is selected by any means, the AID/AOD receives the users selection of a controllable device, transmits that data to a source of the corresponding VTP for that AID and that controllable device, and downloads the appropriate VTP; in some examples one or a plurality of these selection and downloading processes may be performed by any networked electronic device capable of the necessary steps such as in some examples a PC, in some examples a netbook, in some examples a laptop, in some examples an e-pad or e-tablet, in some examples a smart phone, or in some examples another type of networked electronic device.

VTP Connections with TP Devices: Turning now to FIG. 66, "VTP Connections with TP Devices," some examples are illustrated of initiating VTP control of devices over a network. In some examples a VTP running on an AID/AOD 2584 provides means to access 2570, control 2587 and use 2587 one or a plurality of features, functions and capabilities of controllable devices 2593 2596. In some examples a VTP running on an AID/AOD 2584 provides means to extend one or a plurality of features of a Teleportal environment to one or a plurality of AIDs/AODs 2584, by allowing users to access and utilize their Teleportal environment from one or a plurality of locations by means of one or a plurality of devices.

In some examples an initial step is for an AID/AOD 2584 to run a VTP 2571, and in some examples a next step is to select a TP device such as in some examples an LTP 2596, in some examples an MTP 2596, in some examples an RTP 2593, and in some examples another networked electronic device capable of being controlled. In some examples a VTP 2571 running on an AID/AOD 2584 presents one or a plurality of representations that each corresponds to a device that can be controlled 2593 2596. In some examples a VTP 2571 accepts a user's selection of a representation of a device and initiates direct communication with the device which receives that VTP request 2572 from that AID/AOD 2572 2584; in some examples any required identification, authorization and/or credential is predetermined and pre-stored and included in said communication so that authorization and communication proceed rapidly and directly; and in some examples any required identification, authorization and/or credential are required to be entered manually during each instance of use. In some examples a VTP 2571 utilizes navigation and/or search means such as an SD server 2574 to select and request a specific controllable device and/or a controllable function provided by a controllable device; in some examples the right to use a device may not be automatic so that in some examples this may require appropriate identification 2575, in some examples authorization 2575; in some examples authentication 2575, and in some examples other permissions steps as described elsewhere. In some examples when a VTP 2571 utilizes navigation and/or search means such as an SD server 2574, in some examples other SD criteria 2576 may be required and validated by means of predetermined settings 2577 such as in some examples a paid use that is restricted to commercial users with an account 2576 2577, in some examples a paid use that requires a prepaid fee or a paid ticket 2576 2577, in some examples usage may be restricted to members of an authorized group 2576 2577, in some examples usage may require agreeing to accept sponsor(s) advertisements 2576 2577, and in some examples other types of predetermined settings 2576 2577; and if settings conditions 2577 are met then VTP usage proceeds 2578—which in some examples includes monitoring 2578 and/or logging 2578. In some examples a VTP 2571 may request direct connection with the controllable device 2572, or in some examples a VTP may request connection by means of an SD server 2574 2576, and in some examples said VTP requests are denied in which case said VTP connection is blocked 2579.

In some examples a VTP connection 2570 between an AID/AOD 2584 and a controllable device 2593 2596 is established, in which case the AID/AOD 2584 displays an appropriate user interface 2588 2586 (as described elsewhere); which in some examples includes a subset of the controllable device's interface 2588; in some examples includes a consistent look and feel with other Teleportal interfaces 2588; in some examples displays available Teleportal functions and capabilities 2588 (as described elsewhere); and in some examples represents selectable functions, applications, data, services, etc. on the controllable device 2588 (herein controllable functions). In some examples a VTP accepts a user selection of a controllable function 2589 and sends that user selection 2585 2594 2597 to the controlled device 2589 2593 2596 (as described elsewhere). In some examples the controllable function is processed by the controlled device 2590 2593 2596, which produces a result that represents the device's response 2590 (which may include a continuous video and audio response such as from a focused connection or from a broadcast reception), and that response of the controlled device to the user's selection is communicated 2591 2595 to update the VTP display on the AID/AOD 2592 2586 2584. In some examples the user enters another command 2592 which continues the process 2585 2589 2590 2594 2597 2590 2591 2592 2586; and in some examples the user exits the VTP and ends the connection.

In some examples an AID/AOD 2584 is employing a VTP 2587 to utilize a controllable device 2593 2596 which has one or a plurality of open SPLS(s); and in some examples a remote SPLS member opens a focused connection on the controlled device 2593 2596. In this case in some examples the AID/AOD 2584 displays the focused connection by means of the communications link 2595 2586 between the controlled device 2593 2596 and the VTP; in some examples the controlled device 2593 2596 performs appropriate processing of the focused connection 2590, produces appropriate output(s) 2590, and sends said output(s) to the VTP 2591 2595 2585 which displays it on the AID/AOD 2584; and in some examples said user employs the VTP on the AID/AOD 2584 to interact with the identity in the focused connection, with the above process handling the focused connection in accordance with its processing and communications while monitoring for other commands from the user 2585 2589.

In some examples a separate server, application, Web service, or other resource performs one or a plurality of the required steps. For one example a network application may provide means for an more basic AID/AOD 2584 with limited functions to run a VTP that has limited capabilities while still controlling a full-featured TP device 2593 2596; such as in some examples the network application receiving the command from the VTP 2585 2589 and transmitting it to the TP device 2594 2593 2597 2596 where it is processed 2590 and its output 2591 is transmitted 2595 to the network application; then transforming the received output in real-time to a format suitable for the more basic AID/AOD 2584.

Adapted VTP Interface Processing: Turning now to FIG. 67, "Adapted VTP Interface Processing," some examples are illustrated of alternatives for providing one or a plurality of interface adaptations that are created in real-time for to fit the output capability(ies) of one or a plurality of AIDs/AODs 2606 such as in some examples mobile phones 2606, in some examples personal computers 2606, in some examples laptops 2606, in some examples netbooks 2606, in some examples e-tablets or e-pads 2606, in some examples networked televisions 2606, in some examples set-top boxes for cable television or satellite television 2606, in some examples wearable networked computing and broadcasting devices 2606, and in some examples other types of wired and/or wireless networked electronic devices 2606.

In some examples a generalized VTP 2605 that can initiate one or a plurality of connections with one or a plurality of controllable networked electronic devices 2606 2607 2608 is run; in some examples a specific VTP 2605 that is adapted to a specific AID/AOD 2606 is selected (as described elsewhere) and run; in some examples a VTP is downloaded to an AID/AOD 2606 (as described elsewhere) and run 2605; in some examples a VTP has previously been downloaded and stored on an AID/AOD 2606 (as described elsewhere) is run 2605; and in some examples a VTP is run 2605 and executed by an AID/AOD 2606. In some examples running a VTP provides means to select and connect with one or a plurality of controllable networked electronic devices which are herein referred to as TP devices (and in some examples are a specific type of TP device such as in some examples an LTP, in some examples an MTP, in some examples an RTP; and in some examples include another type of controllable networked electronic device [as described elsewhere]).

In some examples as part of establishing said connection (which may optionally be a secure connection such as in some examples password protected) the TP device executes an application such as a VTP server (as described elsewhere); and in some examples as part of establishing said connection the TP device executes an additional application herein named the TP User Interface Application (herein referred to as TP UIA). In some examples a TP UIA is an application; in some examples at TP UIA is a module; in some examples at TP UIA is a component; in some examples at TP UIA is a system; in some examples at TP UIA is a process; in some examples at TP UIA is a method; in some examples at TP UIA is a service, etc.

In some examples a VTP server generates and transmits an appropriate user interface for display by the VTP 2615 2616 on that AID/AOD; and in some examples a TP UIA generates and transmits an adapted user interface for display by the VTP 2615 2616 on a specific AID/AOD. In some examples a VTP server and/or a TP UIA generates and transmits instructions for a VTP to generate a user interface for display 2615 2616 on an AID/AOD. In some examples the interface generated and displayed 2615 2616 on an AID/AOD (whether by a VTP server, by a TP UIA, or by a VTP) includes interactive application interface displays 2615 2616 (such as in computing applications, smart phones, e-pads, and/or other networked electronic devices); in some examples said interfaces include live streaming video 2615 2616; in some examples said interfaces include audio synchronized with video 2615 2616; in some examples said interfaces include other media 2615 2616; in some examples said interfaces include interface components in platform-independent formats 2615 2616; in some examples said interfaces include interface components in platform-dependent formats 2615 2616 and/or operating system-dependent formats 2615 2616; in some examples said interfaces include one or a plurality of media in platform-independent formats 2615 2616; in some examples said interfaces include one or a plurality of media in platform-dependent formats 2615 2616; and in some examples said interfaces include other known interface means 2615 2616. In some examples a VTP's interface display 2616 may include any type(s) of interface components, video, audio and other media appropriate for a specific AID/AOD 2606.

In some examples a VTP interface is adapted to a specific AID/AOD 2615, and said adapted VTP interface is displayed on that AID/AOD 2616. In some examples a VTP monitors the I/O of that AID/AOD 2617 for user instructions 2617 to a TP device to which it is connected over a network (such as in some examples user commands 2617; in some examples user data such as keyboard and/or text input 2617; in some examples user communication such as in a focused connection 2617; in some examples user control of one or a plurality of functions and/or applications on a TP device 2617; and in some examples other types of user interactions 2617) and sends said user instructions 2617 to a VTP server in the TP device 2618. In some examples a VTP server in some examples receives 2618 said user instructions (as described elsewhere); in some examples interprets 2618 said user instructions (as described elsewhere); and in some examples instructs a TP device to process 2618 said user instructions 2618 (as described elsewhere).

In some examples a VTP server receives processed output produced by a TP device 2618 (as described elsewhere) and said output is a logically equivalent UI between the TP device and what a VTP interface can display on an AID/AOD 2625, in which case the VTP server transmits an appropriate user interface 2628 for display by the VTP 2616 on that AID/AOD. In some examples a VTP server receives processed output produced by a TP device 2618 (as described elsewhere) and said output is not equivalent to a UI that can be displayed and requires adaptation for display by a VTP 2625 on an AID/AOD; and in some examples a VTP server determines whether a TP UIA has been run 2619 to provide said UI adaptation(s), and if not it loads and runs said TP UIA 2622. In some examples executing said TP UIA 2622 retrieves AID/AOD device settings 2622 and/or required VTP interface data 2622 (such as in some examples size/position 2622, in some examples layouts 2622, in some examples widgets 2622, in some examples interface components 2622, in some examples size/position of sub-windows 2622, in some examples font 2622, in some examples color[s] 2622, in some examples language 2622, in some examples refresh rate 2622, in some examples communication protocol 2622, in some examples AID/AOD device video and/or audio characteristics 2622, and in some examples other settings 2622 and/or interface means 2622) from local storage 2623 and/or from remote storage 2623. In some examples retrieved data 2622 2623 includes known interface adaptations for a set of GUI entities that may be output by a TP device 2618 and require adaptation to be displayed by a VTP interface 2616 on a specific AID/AOD 2606.

In some examples a TP UIA has been run 2619 but is not ready to process TP device output 2620; and in some examples a VTP server instructs said TP UIA 2624 to accept TP device output and process it 2621. In some examples said TP UIA has been run 2619 and is ready to process TP device output 2620, and in that example TP device output 2618 is processed by said TP UIA 2621. In some examples TP UIA processing 2621 includes said AID/AOD device settings 2622 and/or required VTP interface data 2622 retrieved from local storage 2623 and/or from remote storage 2623.

In some examples a VTP server 2625 receives processed output produced by a TP device 2618 (as described elsewhere) and said output requires adaptation by a TP UIA application 2621; in some examples a TP UIA analyzer performs an analysis on each GUI entity in a TP device's output 2621 (such as in some examples of GUI entities a menu, in some examples a dialog box, in some examples a title, in some examples a button, in some examples an image, in some examples a text block, and in some examples a different GUI entity) to determine what changes, if any, are required to enable the visible state of that entity in the VTP interface on a specific AID/AOD as determined by the retrieved AID/AOD device settings 2622 and/or its retrieved VTP interface data 2622. In some examples the TP UIA analyzer 2621 2630 determines that a specific GUI entity may be displayed in the VTP interface and it is ignored 2628; in some examples the TP UIA analyzer 2621 2630 determines that a GUI entity requires adaptation for it to be displayed in the VTP interface. In some examples the GUI entity adaptation required 2621 is predetermined by the retrieved data 2622 that included known interface adaptations that may be required between a specific TP device's output 2618 and a VTP interface displayed 2616 on a specific AID/AOD 2606. In some examples a GUI entity adaptation is required 2621 and the TP UIA analyzer searches for a match between the TP device's GUI entity that requires adaptation and a known GUI entity that may be displayed in the VTP interface, and if a match is found it performs said adaptation in the interface layout 2621; in some examples the TP UIA analyzer continues with each subsequent GUI entity 2621 until an adapted VTP interface is completed and transmitted 2628 for display in the VTP interface 2616.

In some examples a GUI entity adaptation is required 2621 and the TP UIA analyzer searches for a match between the TP device's GUI entity that requires adaptation but is unable to find a match 2621; in some examples additional TP UIA adaptation is required 2630 and the TP UIA analyzer may search and retrieve additional adaptations data 2631 (such as in some examples additional settings for that specific AID/AOD 2631, in some examples additional GUI entities adaptations for one or a plurality of interfaces on that specific AID/AOD 2631, in some examples additional interface layouts specific to the required GUI entity adaptation 2631, and in some examples additional adaptations data that may be available from one or a plurality of remote databases 2631). In some examples an appropriate match is found 2631 and the required adaptation is performed 2632 in the interface layout and an adapted VTP interface is completed 2632 2633 and transmitted 2628 for display in the VTP interface 2616. In some examples a match is not found 2631 and in some examples a substitute layout is selected for the set of GUI entities that can be displayed 2632, and a sufficient adapted VTP interface can be produced 2632 2633 and transmitted 2628 for display in the VTP interface 2626.

In some examples where GUI entity adaptations are required 2621 and a VTP interface cannot be adapted 2633 (such as by in some examples attempting to utilize predetermined retrieved data 2622 that included known interface adaptations, in some examples by searching and retrieving additional adaptations data 2631 from remote databases, and in some examples by selecting and utilizing a substitute layout for the set of GUI entities that can be displayed 2632), then in some examples a Web browser-based interface may be utilized 2634. In some examples in which an AID/AOD 2606 has an Internet browser capability, a TP UIA 2619 2620 2621 that runs on the same TP device as a VTP server and may be employed to construct a Web browser-based interface 2634. For one example, a VTP web browser-based interface 2616 may be broadly and generically constructed 2634 using Web technology such as DHTML web pages that are displayed by a web browser on the AID/AOD. In this example a TP UIA may convert a TP device's output 2621 into DHTML web pages 2634 that send 2628 2608 the adapted Web browser-based interface 2634 to a VTP for display 2616 by an AID/AOD 2606 that has an Internet browser (which may display the adapted interface regardless of its operating system, its communications connection[s], etc., such as in some examples a mobile phone 2616, in some examples a PC 2616, in some examples a laptop 2616, in some examples an e-pad 2616 or an e-tablet 2616, in some examples a network game system 2616, in some examples a networked television 2616, or in some examples another type of networked electronic device 2616) with some adaptations that result from the screen size and other factors specific to each AID/AOD 2622 2623. In some examples said VTP monitors GUI events within said VTP browser-based web page(s) 2616 on the AID/AOD 2606 for user commands 2617 and sends said user commands 2617 2607 to the TP device 2618 for processing 2618, with output conversion 2634.

In some examples in which an AID/AOD 2606 has an Internet browser capability, a TP UIA 2619 2620 2621 or in some examples a different web browser interface conversion application 2634 may run on a different device that is connected by one or a plurality of disparate networks to a controlled TP device and to an AID/AOD that is running a VTP. In some examples said web browser interface conversion application 2634 may reside and run on a networked web server or other third-party application that is remote from a TP device and is also remote from the AID/AOD; in such a case the conversion application 2634 may receive a TP device's output via a network connection, process it into one or a plurality of appropriate web pages for a specific AID/AOD, and communicate 2628 2608 said adapted interface to the VTP that displays the adapted Web browser-based interface 2616 running on the AID's/AOD's Internet web browser 2606. In some examples said VTP monitors GUI events within said VTP browser-based web page(s) 2616 on the AID/AOD 2606 for user commands 2617 and sends said user commands 2617 2607 to the TP device 2618 for processing 2618, with output conversion 2634 on the remote device via a network.

In some examples a VTP server (or a virtual machine within a VTP server) accepts processed output from the TP device and continuously processes GUI entities as received, and consolidates overlapping and adjacent GUI entities into the minimal set required to update that portion(s) of the VTP client interface (which may reflect the highest current priority part[s] of an application, feature, function, etc. being run by a TP device based on the command[s] of a VTP client such as in some examples the video and audio interactions in a focused connection); and said VTP server updates the VTP client as each set of GUI entities is completed and available for transmission. In some examples a VTP client running on an AID/AOD receives interface updates in the manner of a Web client, that is by polling a VTP server to request updates; and in some examples a VTP server (or a virtual machine within a VTP server) accepts processed output from a TP device, constructs the VTP interface and buffers the constructed interface until a VTP client request is received, at which time it is transmitted to the VTP client. In some examples a VTP server (or a virtual machine within a VTP server) runs an additional TP UIA to provide an adaptive VTP interface so that TP device output fits the display capability(ies) of one or a plurality of disparate AIDs/AODs.

In some examples adaptive interface processing by means of a TP UIA proceeds according to retrieved settings and data 2622 2623 to produce transmitted processed results 2628 that are displayed by a VTP client 2618. In some examples changes are required in that adaptive interface processing 2630 2631 2632 2634 in order to produce transmitted processed results 2628 that are displayed via a VTP client 2618; and in some examples said adapted interface processing changes are automatically saved 2629 in some examples to the TP UIA 2623 for automated future retrieval and use 2619 2622 2623 2621, and in some examples to remote databases 2631 for automated future retrieval and use 2630 2631 2632 2634. In some examples the saving of said changes 2629 may prompt a user to manually authorize saving the changes made in adaptive interface processing 2630 2631 2632 2634 so that the user's judgment determines whether or not to save the new adaptive interface changes to a local TP UIA 2623 and/or to remote databases 2631. In some examples said processes for retrieving, using and saving changes to adaptive interface processing enables the extension of adaptive VTP interface processing to additional and/or evolving AID/AOD devices, interfaces, display technologies and capabilities.

In some examples an AID/AOD may run one or a plurality of VTP's; in some examples a TP device may run one or a plurality of VTP servers (as described elsewhere); in some examples a VTP server may run a plurality of virtual machines that each support a separate AID/AOD (as described elsewhere) and each virtual machine may run a separate TP UIA to adapt the TP device's output to each specific AID/AOD. Therefore, in some examples one or a plurality of VTP(s), one or a plurality of VTP server(s) and one or a plurality of TP UIA instances may combine to enable one or a plurality of AIDs/AODs to simultaneously receive adaptive interfaces while controlling and/or using one or a plurality of TP devices such as in some examples one-to-one (one AID/AOD to one TP device); in some examples many-to-one (a plurality of AIDs/AODs to one TP device); in some examples one-to-many (one AID/AOD to a plurality of TP devices); and in some examples many-to-many (a plurality of AIDs/AODs to a plurality of TP devices).

In some examples a TP device's output 2618 can be both adapted to a specific AID/AOD 2621 and also modified by means of additional post-processing such as in some examples utilizing post-processing to add advertising or other marketing messages (as described elsewhere); in some examples utilizing post-processing to blend in the appearance of a new person or object (as described elsewhere); in some examples utilizing post-processing to remove a person or object (as described elsewhere); in some examples utilizing post—processing to change the behavior of an interface component such as a widget (such as in some examples altering commercially significant data such as which vendor's online store receives a user's purchase actions); in some examples utilizing post—processing to make a combination of changes such as replacing displayed advertisements and changing the online store visited by any remaining advertisements; and in some examples performing other transformations (as described elsewhere). In some examples said additional post-processing transformations are performed by the same TP device as runs the VTP server. In some examples said additional post-processing transformations are performed by a different device such as in some examples an application server, in some examples a third-party service, etc.; and in some examples said different device is connected by one or a plurality of disparate networks to receive the formatted output from a controlled TP device, and also to transmit the additionally post-processed output to one or a plurality of AIDs/AODs that run one or a plurality of VTP's. In some examples said post-processing may be visible such as in some examples the user of a receiving AID/AOD may be informed of the additional post-processing; and in some examples said additional post-processing may be unspoken and performed by intercepting VTP server output and providing one or a plurality of alterations (such as insertions and/or deletions) without informing the one or a plurality of users who receive and view such altered output(s).

SD SERVERS—PRODUCTIVITY FACILITY: A further object of RCTP and VTP is to provide means to aggregate the availability of a plurality of SD's for control by a plurality of CDs, and in some examples provide means to find available SD's (such as in some examples by maps, in some examples by search, in some examples by categories, in some examples by lists, in some examples by menus, in some examples by API's for third-party applications, in some examples by API's for third-party services, in some examples by other types of navigation); in some examples provide means to learn about available SD's; in some examples provide means to find and use SD's immediately; in some examples provide means to find and schedule SD's in the future; in some examples by automated alerts and/or notifications of the availability of pre-selected SD's, etc. In some examples these may be named an SD Server, in some examples SD Service, in some examples "Have It All" Center, in some examples "Enjoy It All" Center, in some examples "Do It All" Center, or in some examples other names and interfaces may be utilized to make visible aggregated SD's as visible, accessible, navigable, usable, and schedulable by a plurality of users, customers, members, subscribers, etc. In some examples an SD Server (s), an SD Service(s), a "Have It All" Center, etc. may be provided as an independent system, method, process, server, service, etc. In some examples an SD Server(s), an SD Service(s), a "Have It All" Center, etc. may be provided as a client(s), module(s), component(s), widget(s), etc. that may be provided by a separate application(s), service(s), network (s), portal(s), etc.

As a result, in some examples one or a plurality of SD Servers may help advance a digital environment that supports the classic definition of productivity: producing more (and doing more) with fewer resources at lower costs. In some examples this may produce the equivalent of greater wealth for consumers because they can accomplish as much or more, while spending less. In addition, SD Servers may increase the revenues or wealth of some companies and/or individuals because they may earn new income from the SD's they own—providing their SD's, when not in use, to others for varying fees while collectively earning new revenues from making their SD's available.

Therefore, in some examples one or a plurality of SD Servers may enable fewer resources to be used such as producing one or a plurality of fewer electronic devices (such as in some examples subsidiary devices as described elsewhere), fewer licenses for application software (such as in some examples office software, productivity software, creation software [for words, music, movies, photos, databases, etc.]

and other types of software applications), fewer copies of digital content (such as in some examples music, movies, TV shows, books, magazines, and other digital content), and utilize those SD's already paid for services (such as in some examples communications, teleconferencing, databases, search, e-mail, etc.) which together lowers costs for consumers who do not need to buy as much of any of these—while still being able to access and use the quantity needed of one or a plurality of these when they need them.

However, if greater usage is stimulated in some examples one or a plurality of SD Servers may enable a larger number of networked electronic devices to be produced (such as in some examples subsidiary devices as described elsewhere), more licenses for application software (such as in some examples office software, productivity software, creation software [for words, music, movies, photos, databases, etc.] and other types of software applications), more copies of digital content (such as in some examples music, movies, TV shows, books, magazines, and other digital content), and greater utilization of those SD's for services that require additional payments (such as in some examples communications, teleconferencing, databases, search, e-mail, etc.) which may still lower costs for consumers who do not need to buy as much of any of these—while still being able to access and use a greater quantity needed of one or a plurality of these when they need them.

The affected industries include industries such as electronic devices, application software, digital content, and various network and digital services). No longer would each customer be required to purchase their own unit(s) of each type of device, software, application, content, and service. Instead, the impact of substantial productivity advances on the leading vendors in these industries can be profound. The advent of a higher productivity digital environment with SD Servers might their alter these and other related industries by turning numerous products into immediately available, reservable and schedulable commodity services. In addition, SD Servers can provide competitive opportunities for new companies to take market share and industry leadership from current corporate leaders in one or a plurality of major industries.

Figure 68:
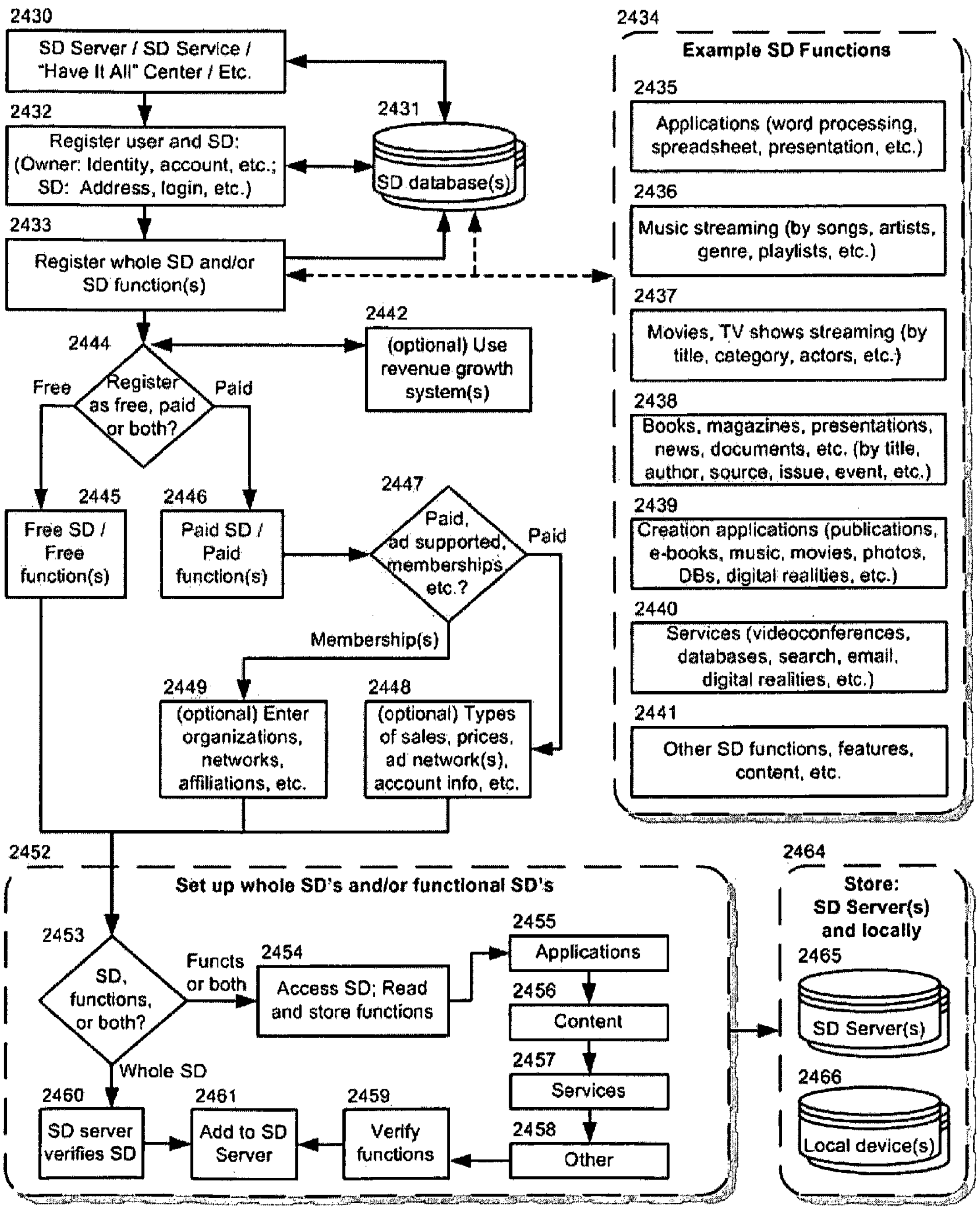
FIG. 68 is a flow chart showing some examples of procedures for registering subsidiary devices (SD) and/or SD functions (such as applications, content, services, etc.) on an SD Server where they may be accessed for use.

FIG. 68, "SD Server(s)—Register Whole or Functional SD's": In some examples SD owners may register and set up one or a plurality of SD's and/or SD functions on an SD server. In some examples an SD server provides one or a plurality of users with the ability to navigate to (which in some examples includes search) and use one or a plurality of SD's and/or SD functions; in some examples the ability to be alerted to the availability of certain types of SD's and/or SD functions; in some examples the ability to schedule or reserve an SD and/or an SD function for a particular date or time; in some examples the ability to include an internal or third-party payment system for the use of an SD and/or an SD function; in some examples the ability to include a security code or group membership credential to make use of an SD and/or an SD function. In some examples one or a plurality of SD servers may have different names, different pricing (including free use), different brands, different access means (including free and open, or private and secure such as for company employees). In some examples in order to register SD's and/or SD functions, owners may open an account into which payments may be deposited based on the use of their SD's and/or SD functions. In some examples an SD may be registered as a whole device; in some examples only SD functions may be registered; and in some examples both whole SD's and their SD functions may be registered. In some examples registered SD functions can include software applications (such as in some examples of office software), in some examples digital content (such as in some examples music, movies, TV shows, books, textbooks, magazines, presentations, news, documents, scientific journals, etc.), in some examples creation applications (such as in some examples e-books, publications, music, movies, photo editing, databases, digital realities, etc.), in some examples services (such as in some examples videoconferencing, database creation, specialized searches, e-mail, digital reality creation, etc.), and in some examples other SD functions (such as in some examples games, virtual realities, RTP's, setting up digital realities for broadcasts, using a set-top box to watch television in real time, making DVR recordings, and any other controllable function of an accessible SD). In some examples an SD owner may simultaneously register a plurality of SD's and/or a plurality of SD functions with one or a plurality of SD servers so that one process provides means to register a plurality of SD's and/or a plurality of SD functions.

In some examples SD's and/or SD functions may be registered as free or paid (such as in some examples free for everyone, in some examples charging for time used, in some examples charging different prices for different functions, in some examples making some functions free and others paid, in some examples making use by a group's members free but paid by non-members, in some examples of a private SD server free for a group's members [such as a corporation's employees] with no access by non-employees, and in some examples any other combination of free use and differential pricing). In some examples a whole SD is registered in which case a registration process verifies the SD by using entered registration data to connect to the SD, initiate remote control and perform tests by known automated testing means. In some examples a plurality of SD functions are registered in which case a registration process verifies the SD functions by using entered registration data to connect to the SD, initiate remote control and perform tests by known automated testing means. In some examples the SD's and/or SD functions that are verified are added to one or a plurality of SD servers; and in some examples the SD's and/or SD functions are added to one or a plurality of local storage in local devices for local remote control use; in some examples SD's and/or SD functions are added to local storage with Web access so that it may be crawled, indexed and provided by external means such as a search engine, API's, third-party services, etc.

Figure 69:
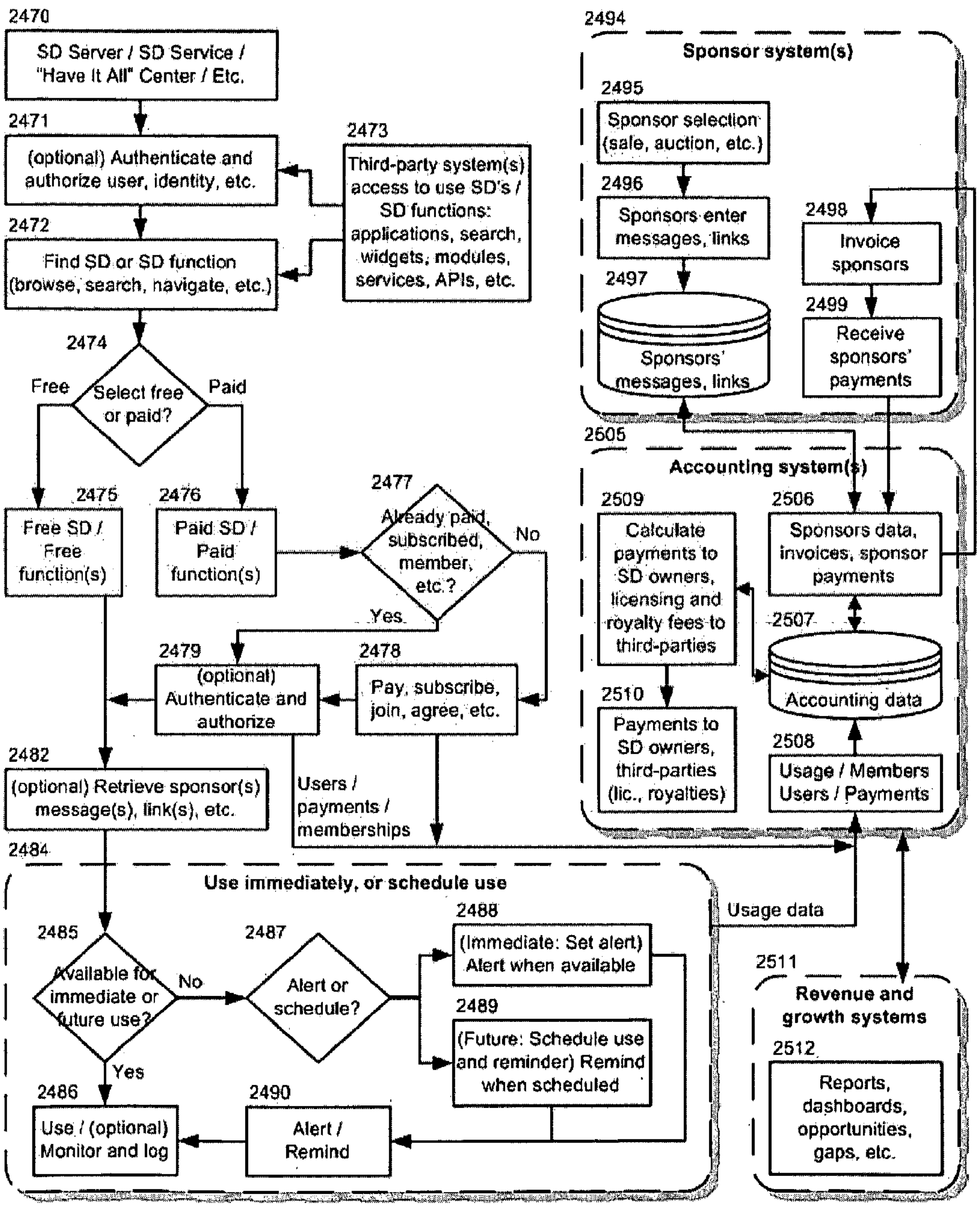
FIG. 69 is a flow chart showing some examples of procedures for finding and using SD's by means of an SD Server, including sponsor/advertising systems, accounting systems to collect revenues and pay SD owners, and growth systems to increase usage and/or revenues.

FIG. 69, "SD Server(s)—Use SD's and/or SD Functions": In some examples an SD server provides one or a plurality of means to be used to provide access to SD's and/or SD functions by one or a plurality of third-parties' applications, services, portals, widgets, search engines, etc. so that SD's and/or SD functions may be packaged and provided in a plurality of ways by a plurality of independent providers. In some examples an SD server provides one or a plurality of interfaces by known means, including in some examples access to one or a plurality of subsets of SD's and/or SD functions such as in some examples those that are free to everyone; in some examples those that are free to members of a specific group; in some examples those that require payment; in some examples those that are at different payment levels; in some examples those that provide in some examples certain types of applications (such as video editing, presentations, etc.), in some examples certain types of digital content (such as in some examples e-books or textbooks or travelers' guides by author, title, genre, popularity, etc.; and in some examples movies by title, actor, genre, popularity, etc.), in some examples services (such as in some examples games, and some examples videoconferencing, and some examples subscription only research services, in some examples digital realities, etc.), and in some examples one or a plurality of dynamic combinations of subsets (such as in some examples movies that are available for free, expensive textbooks that are available at a low cost, etc.). In some examples obtaining paid use may require opening an account and entering a payment means; in some examples obtaining free use may require opening an account and (optionally) entering a payment means; in some examples obtaining members-only use may require opening an account and (optional) an authentication or validation process; in some examples obtaining sponsored use with no payment or a reduced payment may require agreeing to the display of sponsors' messages without additional compensation; and in some examples obtaining use may require logging into a previously opened account, in some examples with authentication and/or authorization.

In some examples sponsor systems provide means for sponsors to purchase the display of static and/or video/audio advertisements, marketing messages and/or other communications; and in some examples users may receive free or lower-cost use of SD's and/or SD functions when sponsors' marketing is displayed; in some examples said sponsors messages may be displayed based upon demographic indicators of certain types of users; in some examples said sponsors messages may be displayed based upon behavioral triggers; in some examples said sponsors messages may be displayed based upon other indicators. In some examples display of a sponsors message and/or the use(s) are logged in a database, in some examples logged in an accounting system, in some examples logged in a billing and payment system, and in some examples logged in another type of system that records the display of sponsors commercial communications and/or its use.

In some examples an SD server provides one or a plurality of means to navigate to and select SD's and/or SD functions in order to enable their remote control by one or a plurality of users; in some examples to schedule reserved use of SD's and/or SD functions at a future date and time; in some examples to receive an alert when an SD and/or an SD function becomes available; and in some examples to receive a reminder when a scheduled SD and/or an SD function is available. In some examples a selected SD and/or SD function is available immediately for use; in some examples an SD is not available, or in some examples it is desired for future use, in which case options may be displayed for user selection (such as in some examples to be alerted when the resource becomes available, in some examples to schedule its use on a day and time, in some examples to schedule a reminder, or in some examples other options for use). In some examples when usage occurs those uses (including in some examples each type of use within one larger session) is monitored and/or logged; in some examples when usage occurs the display of sponsors messages and/or their use is monitored and/or logged; in some examples the resulting usage data from sponsors messages may in some examples be stored locally, in some examples be stored by an SD server, or in some examples be communicated to a monitoring and/or logging application or facility; in some examples said data may include in some examples user identification data, in some examples membership or subscription data, in some examples payment data, in some examples user account data, or in some examples any other data required by the receiving system(s).

In some examples said received usage, monitoring, logging and other received data is utilized to assess and collect payments from users; in some examples said data is utilized to assess and collect payments from membership organizations, employers, etc.; in some examples said data is utilized to assess and collect payments from sponsors; and in some examples said data is utilized to assess and collect payments from other sources. In some examples said data and revenues received are utilized to make payments to the owners of SD's and/or SD functions; in some examples to make payments to third-parties who are due licensing fees; in some examples to make payments to third-parties who are due royalties; and some examples to make payments to third-parties who provide services; and in some examples to make payments to others who are due payments or fees. In some examples SD owners, SD function owners, users, sponsors, membership organizations, content copyright owners, device or application vendors, services vendors, or others maintain an account (s) that includes in some examples means to make payments; in some examples means to receive payments; and in some examples means to edit, adjust and/or correct accounts. In some examples payments are made and/or received automatically; in some examples payments are made and/or received manually; and in some examples account adjustments are made automatically and/or manually. In some examples data required to make and/or receive payments is provided to third parties' accounting and/or billing systems; in some examples data is provided to third-parties' tracking and/or reporting systems; in some examples data is provided to others for other uses.

In some examples revenue and growth systems utilize a subset or plurality of analyzed aggregate data and/or raw data such as in some examples usage, revenue, pricing, payments and other data to identify opportunities to increase revenues, numbers of users, rates of growth, or other success indicators and/or metrics; in some examples said opportunities are utilized by SD owners, in some examples by sponsors, in some examples by third-parties (such as in some examples by digital content owners interested in larger royalties, in some examples by software application vendors interested in larger licensing fees, in some examples by services vendors interested in greater services fees, in some examples by others who are interested in other types of growth or competitive advantages) such that the most lucrative opportunities of various types may be visible to interested parties.

SD Server(s)—Register Whole or Functional SD's: Turning now to FIG. 68, "SD Server(s)—Register Whole or Functional SD's," some examples are illustrated of means for SD owners to register and set up one or a plurality of SD's and/or SD functions on an SD server. Just as there are other types of ARTPM aggregations that provide various types of access such as in some examples SPLS's, in some examples directories, in some examples PlanetCentrals or GoPorts, etc. SD servers can include one or a plurality of servers, applications, systems, processes, methods, services, etc. that are aggregations of SD's and/or SD functions (herein referred to as an SD server). In some examples an SD server includes the ability to navigate and use (find, search, select, connect to, use by remote control, etc.) one or a plurality of SD's and/or SD functions. In some examples an SD server or an associated local or remote application(s) includes the ability to be alerted to the availability of certain types of SD's and/or SD functions; and in some examples scheduling or reserving an SD and/or an SD function for a particular date or time. In some examples an SD server or an associated local or remote application(s) includes the ability to include an internal or third-party payment system(s) if a payment is required for the use of an SD and/or an SD function; in some examples and tree of a security code or membership credential if required to make use of an SD and/or an SD function, etc.

In some examples one or a plurality of SD servers can each have one or a plurality of different names for the actual servers, applications, systems, processes, methods, services, etc. that provide means to find and use one or a plurality of SD's and/or SD functions (with example names described elsewhere). In some examples one or a plurality of SD servers can be public for any customer(s) or users; in some examples one or a plurality of SD servers can be private for the members or subscribers of a particular group, company, association, organization, governance, SPLS, etc. In some examples one or a plurality of SD servers can provide means to find and select an SD and/or an SD function but not connect to it and use it; and in some examples one or a plurality of SD servers can provide means to find and select an SD and/or an SD function including also connecting to it and using it.

SD's 2432 2433 and/or SD functions 2432 2433 2434 may be registered 2432 with one or a plurality of SD servers 2430 2431 in some examples by owners of SD's 2432 (who in some examples are individuals, in some examples are organizations that are set up to provide SD's and/or SD functions, or in some examples are corporations or businesses). In some examples an SD owner's data may be entered 2432 and stored 2432 2431 in one or a plurality of SD databases; including SD owner data such as in some examples said owner's identity 2432, in some examples said identity's account set up information [such as in some examples identity's physical address, in some examples identity's contact information, in some examples identity's other information required to set up an SD owner's account] 2432, in some examples said owner's bank account information [such as in some examples data required to make direct deposits of payments to said SD owner] 2432, and in some examples other information required to set up an SD owner's financial account 2432. In some examples an SD owner's may register and set up one or a plurality of SD's 2432 by entering 2432 and storing 2432 2431 said SD's in one or a plurality of SD databases; including SD data such as in some examples said SD's name 2432, in some examples said SD's address 2432, in some examples said SD's login information 2432, in some examples said SD's functions 2432, in some examples said SD's content 2432, and in some examples said SD's other information required to set up an SD 2432. In some examples a plurality of SD's may be registered and set up rapidly with a plurality of SD servers, by means of an interface designed to register multiple devices simultaneously 2432, in bulk 2432, and/or rapidly 2432. Said registration(s) of SD owners 2432 and registered SD's 2432 may be stored in one or a plurality of locations 2431 such as in some examples one or a plurality of SD servers 2465, SD databases 2431; in some examples temporary storage 2431; in some examples a specific system, method or process such as an SD server 2430 2431, an SD service 2430 2431, a "Have It All" Center 2430 2431, an "Enjoy It All" Center 2430 2431, a "Do It All" Center 2430 2431, or another name(s) 2430 2431; and in some examples any type of network accessible storage 2431.

Said registered SD's may be registered and stored in some examples as a whole device 2432 2433 2431 (such as any of the subsidiary devices described elsewhere), in some examples SD functions may be registered and stored 2432 2433 2434 2431, and in some examples both whole SD's and their functions may be registered and stored 2432 2433 2434 2431. In some examples registered and stored SD functions can include applications 2435 2433 2431 (such as in some examples word processing 2435, in some examples spreadsheets 2435, in some examples presentations 2435, and in some examples other types of application software 2435).

In some examples registered and stored SD functions can include digital music content 2436 2433 2431 (such as in some examples songs 2436, in some examples artists 2436, in some examples music genres 2436, in some examples play lists 2436, in some examples other digital musical content or pre-selected means to access it 2436). In some examples registered and stored SD functions can include digital entertainment content 2437 2433 2431 (such as in some examples movies 2437, in some examples television shows 2437, in some examples Web TV shows 2437, in some examples pictures or images 2437, in some examples other video content 2437, in some examples other visual content 2437, in some examples digital entertainment content by title 2437, in some examples digital entertainment content by category 2437, in some examples digital entertainment content by actors 2437, in some examples other video content or pre-selected means to access it 2437, in some examples other visual content or pre-selected means to access it 2437, and in some examples other digital entertainment content or pre-selected means to access it 2437). In some examples registered and stored SD functions can include published content 2438 2433 2431 (such as in some examples books 2438, in some examples magazines 2438, in some examples news 2438, in some examples presentations 2438, and some examples documents 2438, in some examples greeting cards 2438, in some examples audio books 2438, in some examples educational textbooks 2438, in some examples reference books 2438, in some examples art books 2438, in some examples photography books 2438, in some examples maps 2438, in some examples bulletins 2438, in some examples transcripts or records of public meetings 2438, in some examples travel guides 2438, in some examples picture books 2438, in some examples e-books 2438, in some examples journals 2438, in some examples papers presented at scientific conferences 2438, in some examples corporate white papers 2438, in some examples reports 2438, in some examples digital slide sets for presentations 2438, in some examples publications by title 2438, in some examples publications by category 2438, in some examples publications by authors 2438, in some examples other published content or pre-selected means to access it 2438).

In some examples registered and stored SD functions can include creation applications 2439 2433 2431 (such as in some examples creating publications 2439, in some examples creating e-books 2439, in some examples creating presentations 2439, in some examples creating music 2439, in some examples creating or editing movies 2439, in some examples creating or editing videos 2439, in some examples creating databases 2439, in some examples editing photos 2439, in some examples creating digital realities 2439 [as described elsewhere], in some examples interface design applications for creating or editing interfaces for TP devices, software applications, electronic devices, control panels, etc. 2439, in some examples other types of creation applications 2439, and in some examples other types of editing applications 2439). In some examples registered and stored SD functions can include services for which a particular SD has paid, installed the service(s), and remote control users of said SD may use the service(s) 2440 2433 2431 (such as in some examples high speed Internet 2440, in some examples online games 2440, in some examples teleconferencing 2440, in some examples various types of online services that require a membership or subscription 2440, in some examples research library access 2440, in some examples databases 2440, in some examples using one or a plurality of digital realities 2439 [as described elsewhere], in some examples research journals 2440, in some examples scientific publications 2440, in some examples research services 2440, in some examples specialized search engines in a field such as law or business research 2440, in some examples other types of services 2440).

In some examples registered and stored SD functions can include other SD functions 2441 2433 2431, other SD features 2441 2433 2431, other SD applications 2441 2433 2431, other SD content 2441 2433 2431, other SD services 2441 2433 2431, and other SD capabilities that may be accessed and used by remote control (such as in some examples games 2441, in some examples virtual realities 2441, in some examples RTPs 2441, in some examples constructing a new digital reality that will be broadcast by one or a plurality of controllable RTPs 2441, in some examples using a set-top box to watch television in real-time 2441, in some examples using a set-top box to schedule the recording of a television show 2441, in some examples using a set-top box to play back a previously recorded television show 2441, in some examples using a remotely controllable DVR (Digital Video Recorder) to record and/or play a television show 2441, and in some examples any other controllable function of an accessible SD). in some examples said accessible functions include SD's and/or SD functions that may be used for free, or for a charge, and provide other SD capabilities 2441 such as in some examples games, virtual realities, RTPs, set-top boxes, digital video recorders, etc.

In some examples owners of SD's register their SD's as free 2444 2445 or paid 2444 2446 (including in some examples charging for the time used [such as by the hour] and allowing the use of any and all functions 2434 during that paid time); in some examples owners of SD's register their individual SD functions 2434 as free 2444 2445 or paid 2444 2446 (including in some examples setting different prices for different functions such as charging one price for the use of office software 2435, a second price for streaming music 2436, a third price for reading books online 2438, and a fourth price for using the SD for teleconferences 2440); in some examples owners of SD's register some SD uses as free 2444 2445 and some SD uses as paid 2444 2446 (including in some examples different prices for the different paid functions). In some examples paid uses 2446 may be completely supported by advertising revenues 2447 2448 without charge to the SD users; in some examples paid uses 2446 may be partly supported by advertising revenues 2447 2448 and partly supported by user payments 2447 2448 so that lower usage prices are paid by the SD users 2448 while higher revenues are received by SD sources 2448. In some examples paid uses 2446 may be completely supported by membership payments 2447 2449 or subscription payments 2447 2449 so that members 2449 or subscribers 2449 do not pay anything; in some examples paid uses 2446 may be partly supported by membership payments 2447 2449 or subscription payments 2447 2449 so that lower usage prices are paid by the SD users 2448 so that members 2449 or subscribers 2449 pay potentially reduced prices for SD use.

In some examples other forms of revenues may be received from SD's 2447 which in some examples enables SD's to be provided without charge 2447 2449, and in some examples enables lower SD usage prices 2448; in some examples some revenues may be provided by nonprofit organizations 2447 2449; in some examples some revenues may be provided by grants 2447 2449; in some examples some revenues may be provided by being part of an affiliate network 2447 2449; in some examples some revenues may be provided by an employer 2447 2449 that owns and provides SD's for its employees (including in some examples for doing their jobs, and in some examples for their use outside of work); and in some examples some revenues may be provided by another source—any of which can enable lower SD usage prices or no SD usage payments by SD users 2448.

In some examples owners of SD's set up their SD's 2452 and/or their SD's functions 2452 in part by selecting whether they are setting up a whole SD 2453, a plurality of the SD's functions 2453, or both the SD and a plurality of its functions 2453. In some examples the whole SD is registered 2453 in which case a registration process verifies the SD 2460 by using the previously entered registration data 2432 2433 to connect to the SD 2460, initiate remote control 2460 (as described elsewhere), and perform various remote control tests by known automated testing means 2460. In some examples if the SD is verified 2460 it is added to one or a plurality of SD server(s) 2461 2464 2465; and in some examples if the SD is verified 2460 it's remote control profile is added to local storage 2461 2464 2466 in one or a plurality of the SD owner's CD(s) as a directly remote controllable subsidiary device. In some examples a plurality of SD functions are registered 2453 in which case a registration verifies the SD's functions 2454 by using the previously entered registration data 2432 2433 2454 to connect to the SD 2454, initiate remote control 2454 (as described elsewhere), and perform various remote control tests by known automated testing means 2460. In some examples one or a plurality of registered SD functions is accessed, read and stored such as in some examples applications 2455, in some examples content 2456, in some examples services 2457, and in some examples other SD functions 2458. In some examples the SD functions that are verified 2459 are added to one or a plurality of SD server(s) 2461 2464 2465; and in some examples if the SD functions are verified 2460 their remote control profile(s) are added to local storage 2461 2464 2466 in one or a plurality of the SD owner's CD(s) as directly remote controllable SD functions.

Alternatively, in some examples SD's owners may utilize an application, a module or a third-party system to create a locally stored registration file for one or a plurality of SD's and/or SD functions; in which case in some examples an external search provider, system, service, etc. can crawl, discover, index and/or store said SD and/or SD functions in some examples for searching 2472, in some examples for navigating to by other known means 2472, and in some examples for sending public or private notifications or alerts of newly discovered or currently available resources that include SD's and SD functions, and in some examples for other external uses.

SD Server—Use SD's and/or SD Functions: Turning now to FIG. 69, "SD Server(s)—Use SD's and/or SD Functions," in some SD examples remote control of a whole SD may be enabled as a free 2445 or revenue producing 2446 system, method or process 2432 2433 2431 2444 2445 2446 2452 2453 2461 2464 2465 that can be navigated to by an SD Server 2472 2473. In some examples remote control of SD functions may be provided as a free 2445 or revenue producing 2446 system, method or process 2432 2433 2434 2431 2444 2445 2446 2452 2453 2461 2464 2465 that can be navigated to by function(s) in a number of ways by an SD Server 2472 2473 without needing to know which SD provides said function(s). In some examples an SD server(s) may also be part(s) of other applications 2473, systems 2473, services 2473, portals 2473, widgets 2473, search engines 2473, etc. so that SD's and/or SD functions that may be selected and remotely controlled can be accessed from a plurality of third-parties 2473, applications 2473, services 2473, etc. In some examples access to an SD server 2470 2472 2473 may be implemented and/or packaged in a range of ways using known methods by which applications, widgets, components, modules, etc. may interwork with each other (by any known method, system or process).

In some examples access to an SD server 2470 2472 can be cross-platform and independent of one operating system or application execution environment. In some examples SD's can be crawled, indexed and (optionally) cached by an SD server and/or by an external search provider; in some examples for sending "push" alerts or notifications such as to announce the availability of new or existing SD's, and/or new or existing SD functions, in some examples for storing SD data, in some examples for storing available SD functions, in some examples for updating stored data on previously registered SD's and/or SD functions.

In some examples said means for SD server access are displayed by an interface(s) for a SD server; in some examples by a third-party application(s) 2473; in some examples by a search engine that can search accessible SD's 2473, or search accessible SD functions 2473, or search SD's and SD functions based on real-time availability 2473; in some examples by a client interface such as a widget(s) 2473, web client(s) 2473, module(s) 2473, component(s) 2473, third-party service(s) 2473, etc. that may be provided by a separate application(s) 2473, service(s) 2473, network(s) 2473, portal(s) 2473, etc. that access SD server data and/or direct SD data. Herein direct SD server navigation 2470 and navigation through a plurality of means 2470 2473, whether to select and control a whole SD or one or a plurality of SD functions; and whether for free uses, subscriptions/membership uses or paid uses are collectively referred to as an SD server and/or the use of an SD server.

In some examples using an SD server 2470 2473 (optionally) can require authentication and/or authorization 2471 (utilizing processes described elsewhere, or other known processes). If authentication and/or authorization are required then in some examples a user may submit a user ID 2471, in some examples an identity 2471, in some examples a password 2471, in some examples a code 2471, in some examples a credential 2471, in some examples a membership 2471, or in some examples another form of authentication and/or authorization 2471. In some examples authentication and/or authorization are denied and said user is denied use of the SD server 2470 2473. In some examples authentication and/or authorization are approved and use of the SD server 2470 2473 is permitted according to the permissions granted to that specific user. In some examples authentication and/or authorization are not required and a user proceeds directly to selecting an SD 2472 or an SD function 2472.

In some examples requests to find and access an SD 2472 or an SD function 2472 are received, and said request includes selection of a navigation means such as in some examples a search(es) 2472, in some examples a list(s) 2472, in some examples a portal(s) 2472, in some examples a directory(ies) 2472, in some examples a category(ies) 2472, in some examples a group(s) 2472, and in some examples any other known selection means 2472. In some examples an SD server 2472 accesses the full range of SD's 2472 and/or SD functions 2472 on one or a plurality of SD server(s) 2472, and provides means to navigate 2472, filter 2472, search 2472, select 2472, connect 2472, remote control 2472, etc. SD's and/or SD functions from the range of choices provided.

In some examples an SD server 2470 2472 accesses a subset(s) of SD's 2473 and/or SD functions 2473 and provides access to one or a plurality of subsets of SD's 2473 and/or SD functions 2473 such as in some examples those that are free 2475 (and can be remotely controlled and used without a charge or cost); in some examples said subsets include SD's and/or SD functions that are commercial and require payment 2476 2477 2478; in some examples said subsets include SD's and/or SD functions that may be used for free or for a charge and provide music 2436; in some examples said subsets include SD's and/or SD functions that may be used for free or for a charge and provide entertainment shows 2437 such as in some examples movies, television shows and/or other types of recorded entertainment; in some examples said subsets include SD's and/or SD functions that may be used for free or for a charge and provide word-based content 2438 and static picture-based content 2438 such as in some examples books, magazines, textbooks, news, articles, papers, reports, presentations, documents, maps, bulletins, transcripts, records, guides, journals, etc.; in some examples said subsets include SD's and/or SD functions that may be used for free or for a charge and provide applications 2435 such as in some examples word processing, spreadsheets, presentations, etc.; as well as creation/editing applications 2439 such as in some examples publications, ebooks, music, movies, videos, photo editing, databases, digital realities, design, interfaces, etc.; in some examples said subsets include SD's and/or SD functions that may be used for free or for a charge and provide services 2440 such as in some examples games, teleconferencing, digital realities, research services, limited access services, etc.; and in some examples said subsets include SD's and/or SD functions that may be used for free or for a charge and provide other SD capabilities 2441 such as in some examples games, virtual realities, RTPs, set-top boxes, digital video recorders, etc.

In some examples requests to select and use an SD 2472 or an SD function 2472 includes selection of whether said use is free 2474 or paid 2474; in some examples a request is to use and control a free SD 2475 and/or a free SD function(s) 2475, in which case a user may (optionally) be requested to enter valid identity and/or contact information prior to said free use(s). In some examples a request is to use and control a paid SD 2476 and/or a paid SD function(s) 2476. In some examples said paid requests 2476 are for SD's and/or SD functions that are restricted to commercial users and in some examples this may require payment 2477 2478 such as by opening an account and entering a credit card for payment; in some examples paying a fee 2477 2478; in some examples registering and providing identity and contact information in lieu of payment 2477 2478; and in some examples other known payment means or processes 2477 2478. In some examples said paid requests 2476 are for SD's and/or SD functions that are restricted to members of an authorized group(s) and in some examples this may require presenting a code 2477 2479, in some examples a credential 2477 2479, in some examples a membership confirmation 2477 2479, in some examples an authorized identity 2477 2479, in some examples and automated presentation of an employee's login or credentials 2477 2479 if the group is a corporation or business association; in some examples signing up for a new membership or subscription 2477 2479, in some examples another type of membership or subscription process 2477 2479.

In some examples the actual free uses 2475, paid uses 2476, and/or membership or subscription uses 2477 2479 may (optionally) include in some examples retrieving and displaying sponsor(s) messages 2482, in some examples retrieving and displaying sponsor(s) advertisements 2482, in some examples retrieving and displaying sponsor(s) links 2482, in some examples retrieving and displaying sponsor(s) marketing information 2482, and in some examples retrieving and displaying other types of communications 2482. In some examples the revenue from said messages 2482 may be used to replace users' payments and thereby provide free SD use 2475 and/or free SD functions 2475. In some examples the revenue from said messages 2482 may be used to replace part of the revenues from users and thereby provide lower-cost SD use 2475 and/or lower-cost SD functions 2475. In some examples the revenue from said messages 2482 may be used to increase the revenues from all sources and thereby reduce higher profits from providing SD's for use 2475 and/or produce higher profits from providing SD functions for use 2475.

In some examples sponsor systems 2494 provide various systems, processes, methods and other means for generating revenues, which may include marketing, advertising, product information, sales, marketing information, branding, public relations, and other forms of communications for which access to SD users may be purchased by sponsors. In some examples said sponsor systems 2494 include sponsor selection 2495 such as by auction(s) 2495, sale 2495, etc. In some examples selected sponsors 2495 enter deliverable messages 2496 which may include advertising 2496, marketing information 2496, product information 2496, video (including audio) 2496, images 2496, branding 2496, other sponsors' messages and/or content 2496, and other types of commercial information 2496. In some examples said entered messages 2496 may (optionally) include categories such as in some examples the type of SD used 2472, in some examples the type of SD function used 2472, in some examples the type of SD content accessed 2472, in some examples the type of SD service used 2472, in some examples by the name of a competing product that is used 2472 2484 2486, and in some examples other types of behavioral triggers by a user of an SD or an SD function 2484 2486. In some examples said entered messages 2496 are stored for retrieval 2497 during SD use 2482 as described elsewhere. In some examples said retrieved and displayed messages 2497 2482 2486 are recorded in one or a plurality of systems such as in some examples an accounting system 2505 2506, in some examples a monitoring system 2486 2508 2507, in some examples a logging system 2486 2508 2507, in some examples a billing and payment system 2505 as described elsewhere, or in some examples another type of system that utilizes sponsors data 2494 2495 2496 2497 and/or its usage 2482 2486.

In some examples various uses of an SD device 2484 are described elsewhere. In some examples an SD or SD function is available 2485 immediately and used 2486; in some examples said usage is (optionally) monitored 2486 and/or (optionally) logged 2486 as described elsewhere. In some examples an SD or SD function is not available 2485, or in some examples it is desired for future use, in which case options are displayed 2487 such as in some examples to request an alert 2488 as soon as the requested resource becomes available and receive said alert 2491 when that occurs so the subsidiary device may be used 2486 (with optional monitoring 2486 and/or optional logging 2486 of use). In some examples a subsidiary device is not available 2485 in which case options are displayed 2487 such as in some examples to schedule the use on a specific day and time in the future 2489, and in some examples to schedule a reminder for the desired date(s) and time(s) 2489; then in some examples receive a reminder 2490 at that time, and in some examples use the subsidiary device 2486 as scheduled (with optional monitoring 2486 and/or optional logging 2486 of use). In some examples a subsidiary device is found and selected 2484 2485 but the user wants to schedule its use on a specific day and time in the future, and upon that optional user selection 2485 2487 in some examples the user schedules its use on a specific day and time in the future 2489, and in some examples the user schedules a reminder for the desired date(s) and time(s) 2489; then in some examples the user 2489 and receive a reminder 2490 at that time so the subsidiary device may be used 2486 as scheduled (with optional monitoring 2486 and/or optional logging 2486 of use).

In some examples said monitored 2486 and logged 2486 usage data 2486 may be communicated by one or a plurality of networks to an appropriate monitoring and/or logging application or facility 2508 2507 where said data is received and stored. In some examples user data 2478 2479 during the selection process may be communicated by one or a plurality of networks to an appropriate monitoring and/or logging application or facility 2508 2507 where said data is received and stored. In some examples membership data 2479, subscription data 2479, or other user identification data during the selection process may be communicated by one or a plurality of networks to an appropriate monitoring and/or logging application or facility 2508 2507 where said data is received and stored. In some examples payment data 2478 2479 and/or user account data 2478 2479 during the selection process may be communicated by one or a plurality of networks to an appropriate monitoring and/or logging application or facility 2508 2507 where said data is received and stored.

In some examples said monitored, logged and stored data 2508 2507 is used to provide accounting systems 2505 and payments 2510. In some examples accounting systems 2505 (such as described elsewhere) receive revenues 2508 2506, in some examples collect revenues 2508 2506, in some examples store and/or retrieve stored revenues data 2506 2507 2508, in some examples calculate payments 2509, in some examples make payments 2510, and in some examples perform other accounting functions. In some examples accounting systems 2505 receive and collect payments from the use of SD's 2486, in some examples from payments from the use of SD functions 2486, in some examples collect payments from the display of sponsors marketing messages 2482, in some examples collect payments from the use of sponsors marketing messages 2482, in some examples collect payments from organizations for the use of SD's and or SD functions used by their members, subscribers, employees, etc. 2479, and in some examples receive or collect revenues from other sources.

In some examples said stored usage data 2506 is employed in some examples to invoice sponsors 2498; in some examples to receive sponsors' payments 2499; in some examples to acquire revenues from sponsors 2506; and in some examples to invoice organizations for use of SD's and/or SD functions used by their members, subscribers, employees, etc. 2479. In some examples sponsors are invoiced for advertisements 2506 2497 2498 2499; in some examples sponsors are invoiced for marketing messages 2506 2497 2498 2499; in some examples sponsors are invoiced for SD uses and/or SD functions uses where they have placed their products into use 2506 2497 2498 2499; in some examples sponsors are invoiced for brand placements where they have placed their related brands into SD uses 2506 2497 2498 2499; in some examples sponsors are invoiced for marketing information delivered within SD uses 2506 2497 2498 2499; in some examples sponsors are invoiced for links displayed (such as to make an online purchase, see an item in an online store, add an item to a wish list, etc.) during an SD use 2506 2497 2498 2499; in some examples sponsors may be invoiced for or another e-commerce action 2506 2497 2498 2499. In some examples users pay directly for SD uses 2477 2478; in some examples users who are members 2477 2479 are entitled to use one or a plurality of SD's; in some examples users who are members 2477 2479 are entitled to use one or a plurality of SD's; in some examples users register 2477 2478 in order to use one or a plurality of SD's; in some examples users do a new registration, membership, subscription, etc. 2477 2478 in order to use one or a plurality of SD's; in some examples users who are governance members 2477 2479 are entitled to use one or a plurality of SD's; and in some examples users make cash payment or provide other forms of entitled uses by other means.

In some examples one or a plurality of revenue sources 2494 2476 2478 2479 2482 2484 such as sponsors, organizations, users, etc. maintain a financial account that includes deposited monies, and accounting invoices automatically bill said depository accounts and receive payments in one electronic step; in some examples one or a plurality of revenue sources 2494 2476 2479 2482 2484 maintain electronic payment instrument in their financial accounts (such as in some examples a credit card, in some examples automatic payment by a bank account, in some examples automated payments by a third-party payment service, etc.) and said invoices automatically invoice said revenue source's financial account and receive payment in one electronic step by means of said electronic payment instrument; and in some examples one or a plurality of revenue sources 2494 2476 2479 2482 2484 receives billing or invoices and makes a separate payment(s).

In some examples accounting systems 2505 calculate and pay SD owners for the use of their device(s) and/or the use of their SD's functions 2509 2510 which in some examples include applications, in some examples include content, in some examples include services, and in some examples include other SD capabilities. In some examples accounting systems 2505 calculate and pay third-parties in some examples when their devices are used and payments, licensing fees, royalties or types of other payments are due 2509 2510; in some examples accounting systems 2505 calculate and pay third-parties in some examples when their applications are used and payments, licensing fees, royalties or types of other payments are due 2509 2510; in some examples accounting systems 2505 calculate and pay third-parties in some examples when their digital content is used and payments, licensing fees, royalties or other types of payments are due 2509 2510; in some examples accounting systems 2505 calculate and pay third-parties in some examples when their services are used and payments, licensing fees, royalties or other types of payments are due 2509 2510; in some examples accounting systems 2505 calculate and pay other costs and expenses to third-parties for related services 2509 2510 such as in some examples storing and delivering sponsors messages 2494, in some examples network services such as transmission, storage, etc.; in some examples application services such as developing and running one or a plurality of SD servers 2470 2473; in some examples for maintaining user accounts 2471; in some examples for maintaining and running an online e-commerce store; in some examples for other SD server features or services.

In some examples said accounting system(s) 2505 provides said accounting data 2507 to third parties' accounting and/or billing systems so that said third-parties can receive revenues from one or a plurality of sources 2478 2479 2482 2484 2494 2497 2499; and also calculate and make third-party payments to in some examples SD owners 2509 2510, in some examples third-party payments to those due licensing fees 2509 2510, in some examples third-party payments to those due royalties 2509 2510, in some examples third-party payments to those who provide services 2509 2510, and in some examples third-party payments to others who are due payments or fees.

Alerts, reservations, reminders: In some examples a user has located an SD or an SD function that is not available 2485, and in that case said user may set a current alert 2487 or a current notification 2487 (herein named "alert") which are described elsewhere. In some examples an alert for a specific SD or a specific SD function may be set to notify the user immediately 2488 as soon as the device or function becomes available 2490. In some examples some alerts may be created, stored, retrieved, edited, activated, deactivated, deleted, etc. (referred to herein as "managed") as described elsewhere. When said alert is received 2490 it includes means to connect to the SD or SD function and use it remotely. In some examples a user has located an SD or an SD function that is not available 2485, and in that case said user may schedule a future reservation 2487 (herein named "scheduled reminder"); in some examples a future reservation for a specific SD or a specific SD function may be set to remind the user 2490 at the scheduled date and time when the device or function is reserved for use 2490. In some examples some scheduled reminders may be created 2489, stored 2489, retrieved 2489, edited 2489, activated 2489, deactivated 2489, deleted 2489, etc. (referred to herein as "managed"). In some examples some scheduled reminders may be managed in TP user profiles 2489; in some examples some scheduled reminders may be managed in TP user records 2489; in some examples some scheduled reminders may be managed in one or a plurality of a person's directory entry(ies) 2489 such as in each identity's directory entry; in some examples some scheduled reminders may be managed in other user data sources such as in some examples an identity's presence settings 2489; in some examples some scheduled reminders may be managed in other applications 2489 or in other services 2489; in some examples some scheduled reminders may be managed by other means. In some examples one or a plurality of scheduled reminders 2489 are retrieved 2490 from one or a plurality of sources of scheduled reminders; and some examples said retreat scheduled reminders 2489 2490 are maintained as a list of reminders 2489; and in some examples a scheduled reminder is sent 2490 to the appropriate identity(ies) about the availability of a reserved SD or SD function. When said scheduled reminder is received 2490 it includes means to connect to the SD or SD function (as described elsewhere) and use it remotely.

Revenue and growth systems: In some examples revenue and growth systems 2511 (such as described in more detail elsewhere, but described here in a brief summary, as well as having some examples of specific features called out) utilize data 2505 2506 2507 2508 2509 2510 so that SD owners, sponsors 2494 and others (herein collectively called "interested parties") can identify opportunities to increase revenues 2510, numbers of users 2486, rate of growth 2512, or other success indicators and metrics 2512. In some examples interested parties utilize usage data 2475 2476 2478 2479 2508 2507; in some examples interested parties utilize accounting data 2507; in some examples interested parties utilize sponsors data (including user actions based on sponsor messages) 2497 2506 2507; in some examples interested parties utilize automatically analyzed data such as ranked revenue opportunities 2507 2509 2510; in some examples interested parties utilize automatically analyzed data such as ranked growth opportunities 2507 2509 2510; in some examples interested parties utilize automatically analyzed data such as ranked SD functions by numbers of users, rate of growth, or other comparative metrics 2507 2509 2510; in some examples interested parties utilize reports 2512, dashboards 2512, ranked opportunities 2512, gap analyses 2512, or other types of analyzed and reported data 2512.

In some examples interested parties receive revenue and growth systems data 2511 2512 in some examples from one or a plurality of SD servers 2470, and in some examples from one or a plurality of third-party SD application(s) 2473; in some examples from one or a plurality of search engines that search accessible SD's 2473, or search accessible SD functions 2473, or search SD's and SD functions based on real-time availability 2473; in some examples from one or plurality of client interface usage data such as widget(s) 2473, web client(s) 2473, module(s) 2473, component(s) 2473, third-party service(s) 2473, etc. that may be provided by a separate application(s) 2473, service(s) 2473, network(s) 2473, portal (s) 2473, etc. that provide access to SD's and/or to SD functions.

In some examples interested parties receive revenue and growth systems data 2511 2512 in some examples from an online analytics and reporting service(s) 2511 2512, in some examples an online dashboard(s) service(s) 2511 2512, in some examples a behavior tracking and ad serving service 2511 2512, in some examples another type of tracking, monitoring, and/or measurement service(s) 2511 2512. In some examples interested parties may (optionally) receive revenue and growth data 2511 2512 from one or a plurality of third-party business systems, or in some examples another external applications' tracked data, logs, etc. to utilize said types of data.

In some examples said revenue and growth systems data 2511 2512 is used to determine which types of SD's to provide 2472 2475 2476; in some examples said data 2511 2512 is used to determine which types of SD functions, SD applications, SD content, etc. to provide 2472 2475 2476; in some examples said data 2511 2512 is used to determine which kinds of free SD usage and/or free SD functions to provide 2475 to achieve various business goals such as growth in usage numbers 2475 versus growth in paid revenues 2476; in some examples said data 2511 2512 is used to determine which SD price levels to set for which SD's and/or which SD functions; in some examples said data 2511 2512 is used to determine how to increase revenues and earnings; in some examples said data 2511 2512 is used to determine how to increase the numbers of users (either free or paid as desired); in some examples said data 2511 2512 is used to determine how to increase sales revenue; in some examples said data 2511 2512 is used to determine how to increase registrations; in some examples said data 2511 2512 is used to determine how to increase subscriptions; in some examples said data 2511 2512 is used to determine how to increase memberships; in some examples said data 2511 2512 is used to determine how to increase how to develop and obtain feedback on new types of SD's and/or new SD features); in some examples said data 2511 2512 is used to determine how to provide access to more SD's and SD functions so that people can live better without needing to buy or spend as much (on SD's and/or SD functions); and in some examples said data 2511 2512 is used to determine new ways to experiment with various new options for utilizing SD's and SD functions.

Some SD information server alternatives: In some examples SD information servers can be separate systems, methods, processes, etc. for aggregating SD data (such as in some examples usage, revenue, pricing, payments and other data) to show how SD's and SD functions are used and payments produced, so that aggregated usage and/or payment information may be made visible, accessible, navigable, connectable and displayable by others (herein referred to as revenue and growth systems 2511 2512). In some examples said SD revenue and growth systems may require special access to view said aggregated data such as a login ID and password). In some examples SD revenue and growth systems may include broad or focused data from SD usage and/or SD functions usage, and in some examples SD information servers may include focused public or private subsets of SD usage data and/or SD functions usage data. In some examples SD revenue and growth systems may display calculated and/or estimated gaps between the quantity(ies) of SD's and/or SD functions available and their actual usage and revenues, in order to identify and present the most lucrative financial opportunities to provide and sell remote control of SD's and/or SD functions. In some examples SD revenue and growth systems that provide information and data can be included with SD servers, and in some examples SD revenue and growth systems can be provided by third-parties. In some examples SD information servers can be accessed by one or a plurality of sources who sell SD usage and/or SD functions (such as to determine which SD's and/or SD functions to provide to increase revenues); in some examples they can be accessed by one or a plurality of customers or prospective customers (such as to determine which types of SD's and/or SD functions are most popular and most desirable), in some examples they can be accessed by one or a plurality of network application(s) or service(s) (such as to determine the volume and types of network services required to provide SD's and/or SD functions; and in some examples by others who can make use of SD information server data.

DIGITAL PRESENCE AND PRESENCE SERVICES SUMMARY: It is an object of ARTPM Digital Presence (hereinafter Teleportal Digital Presence, or TPDP) to introduce a digital expansion of physical presence whereby Digital Presence (TPDP) in some examples becomes as important as physical presence, and in some examples TPDP may become more important. To achieve this it modifies the current reality's digital telecommunications which is product-focused (such as an Apple iPhone), vendor-focused (such as Microsoft Windows Phone 7) and service contract-focused (such as a Verizon cell phone contract)—which are typically designed to make one specific communication to an individual and/or a group at one time, then terminate said communication. As a result, current telecommunications services are often priced and sold by the type of use such as one price for a text or texting, another price for one phone call or a fixed amount of voice calling time, another price for a kilobyte of data or a limited quantity of data, etc—as if the electricity used to watch a television show was priced at a different rate than the electricity used to heat a house for one night. The TPDP's high-level principle is that users should have "digital presence" (which is broader conceptually than a telecommunications product, a telecommunications vendor or a telecommunications service contract) rather than the many individual devices and services a customer may have been sold to communicate with. With TPDP in some examples this means real-time digital presence (including always-on communications) between a plurality of different types of devices with more capabilities and in some examples with simpler end-user operations by means of a consistent TP interface (as described elsewhere); and in some examples a plurality of users may participate in one or a plurality of concurrent continuous connections by means of various devices and networks.

In some examples TPDP is different than current digital communications or virtual reality. In physical reality, when you walk outside and stroll down a physical street you can see everyone and everything there, and they can see you. If you are physically present on a street anyone can turn to you; make you their focus and talk directly to you. When you are in a physical conversation the other person(s) in it can hear you, too. In the digital reality of ARTPM's Shared Planetary Life Spaces (SPLS), when you figuratively "walk out" on a "digital street" it is as if you have walked out on a physical street—you are "present" in the digital environment and can see everyone and everything that is digitally present with you, and they can digitally see you. If you and one or a plurality of others focus on each other you can hear each other, too—just like when some of those present on a street turn to each other and have a physical conversation. It is not a virtual reality, however, which uses illustrations, pictorial images and avatars instead of the real images of real people and real places.

There are also differences between physical and digital reality, however, starting with a first example of how you enter TPDP: You enter TPDP by selecting one or a plurality of identities by means of logging in as an identity, or using a device such as a mobile phone that is attached to one or a plurality of selectable digital identities (which in some examples are selected manually, and in some examples are selected automatically). In some examples you choose to "be" yourself digitally, or in some examples you can choose to "be" any one or a plurality of your identities. Next, in some examples you select one or a plurality of devices (a current parallel for multiple devices is carrying a work mobile phone like a Blackberry that may include paging and e-mail, and also carrying a personal mobile phone to stay in touch with family and friends by voice, text, email, twitter, pictures, etc. Further, in some TPDP examples you open or join one or a plurality of SPLS(s) for each identity and device, which opens your digital presence with the IPTR (Identities [people], Places, Tools, Resources, etc.) in each of those SPLS(s). In some examples one step is to select a focused connection (or a plurality of focused connections)—the digital parallel to approaching one person on a physical street to have a conversation, while everyone and everything else present is in the background and cannot hear the conversation (in an SPLS only one or a plurality of chosen connections are the active focused connection[s] at one time, while the other SPLS members are in the background even though they are concurrent and may be focused immediately). Continuing this parallel between physical and digital environments, in a physical conversation the members of that conversation can hear it while others are too far away to hear it—again similarly, in some examples of a TPDP SPLS connection the members of a focused connection can hear it and see its related resources (such as a presentation, an application, other people in the focused connection, etc.) while those in the SPLS who are not part of the focused connection are not part of its audio, content, members, related resources, etc.

Figure 70:
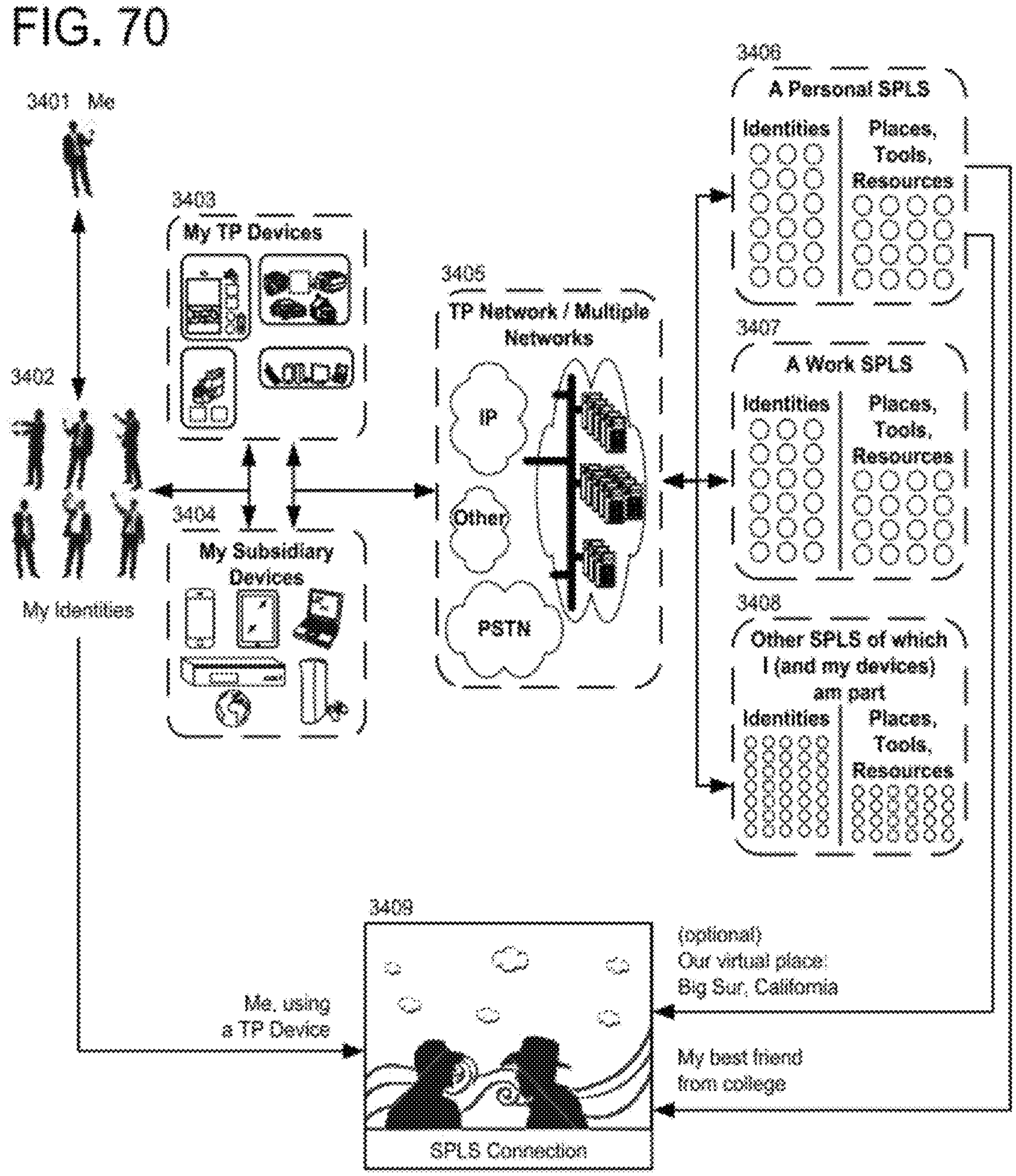
FIGS. 70, 71 and 72 are a pictorial block diagrams that illustrate some examples of TP digital presence for personal uses (70), commercial uses (71), and mobile uses (72).
Figure 71:
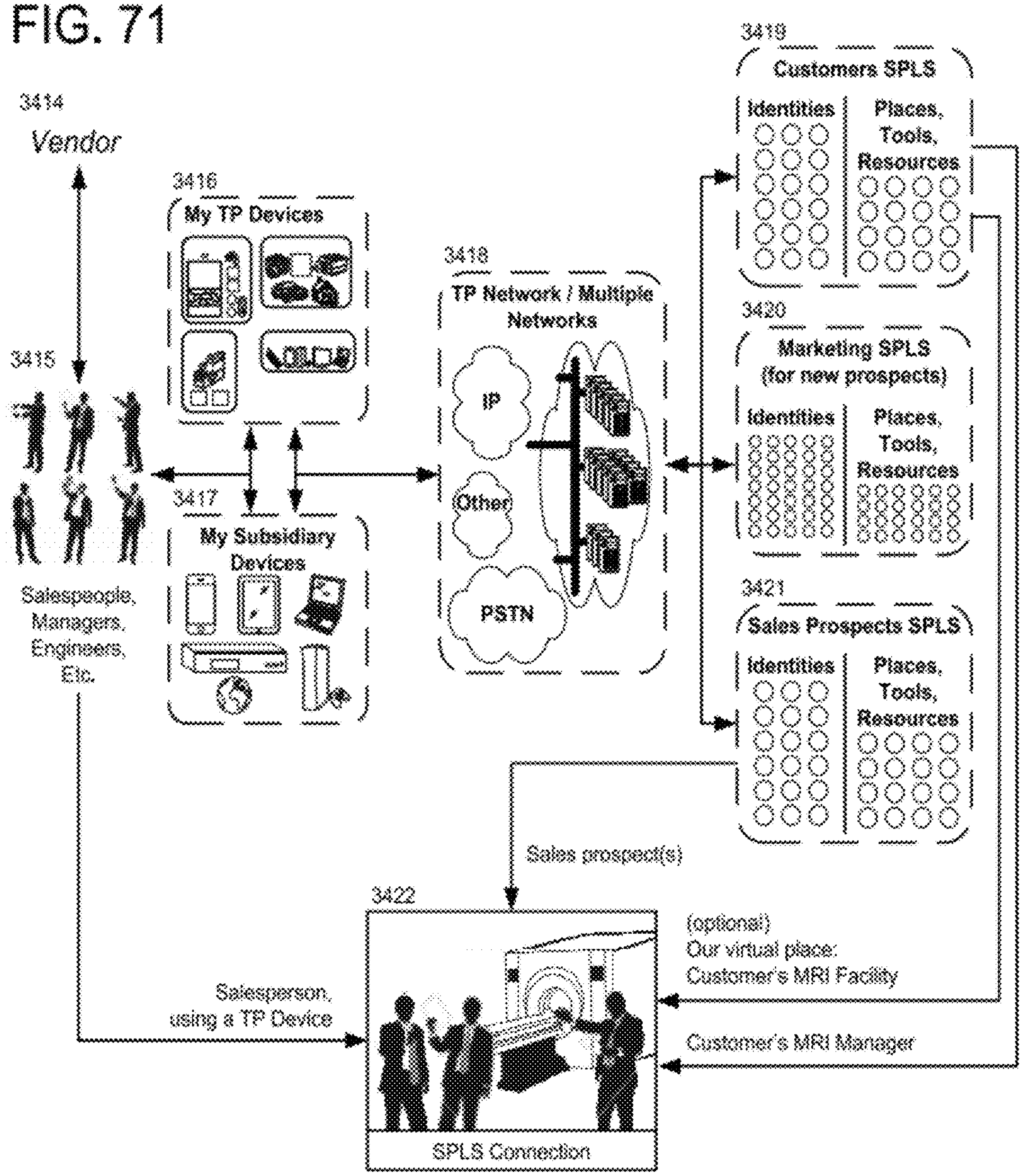
Figure 72:
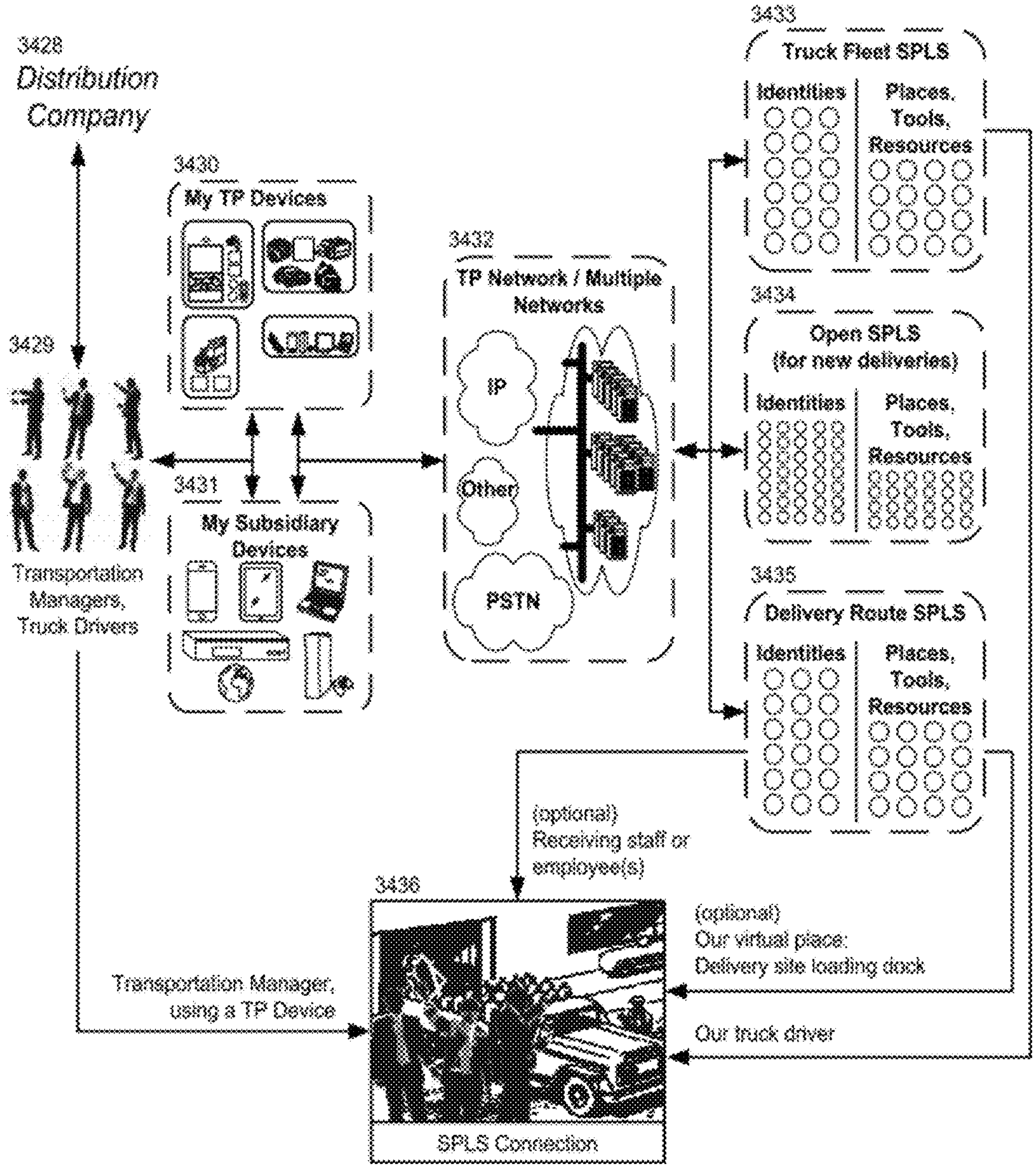

Some examples illustrate TPDP with a plurality of figures and examples (which are more descriptive and detailed than the following summary): FIGS. 70, 71 and 72—types of focused connections: It is an object of the TPDP to provide varying types of digital presence. These are illustrated herein with three types of presence; in some examples individual(s) presence (FIG. 70), in some examples commercial presence (FIG. 71), and in some examples mobile presence (FIG. 72). Each illustration starts with a user in the top left with identity selection on the left, device selection as a next step and utilization of one or a plurality of networks subsequent to that. Each identity has opened one or a plurality of SPLS's on the right with each SPLS including a plurality of IPTR (Identities, Places, Tools, Resources). From the open SPLS's the actor focuses a connection at the bottom with one or more SPLS members (including any appropriate IPTR). The focused connection may optionally be located in a place with various types of places illustrated in these examples and elsewhere.

FIG. 73—example architecture: A further object of the TPDP is a presence architecture that enables a presence service(s) to collect, combine and evaluate state information from multiple identities and devices that are used throughout a day into one logical user presence indication that is displayed in an appropriate and different form and manner for various SPLS members and/or connections, and/or for various presence-aware applications or presence-aware services. This presence indication is updated as device state information is received, especially from state changes that are associated with the availability of a user. Said presence architecture and service(s) includes rules, categories, profiles, groups etc., that in some examples controls the visibility of various types of presence information, in some examples the automation of presence system connections, in some examples provisioning of presence, in some examples dissemination of presence information, and in some examples external presence-aware applications and or services that may transmit and/or receive presence information.

Figure 76:
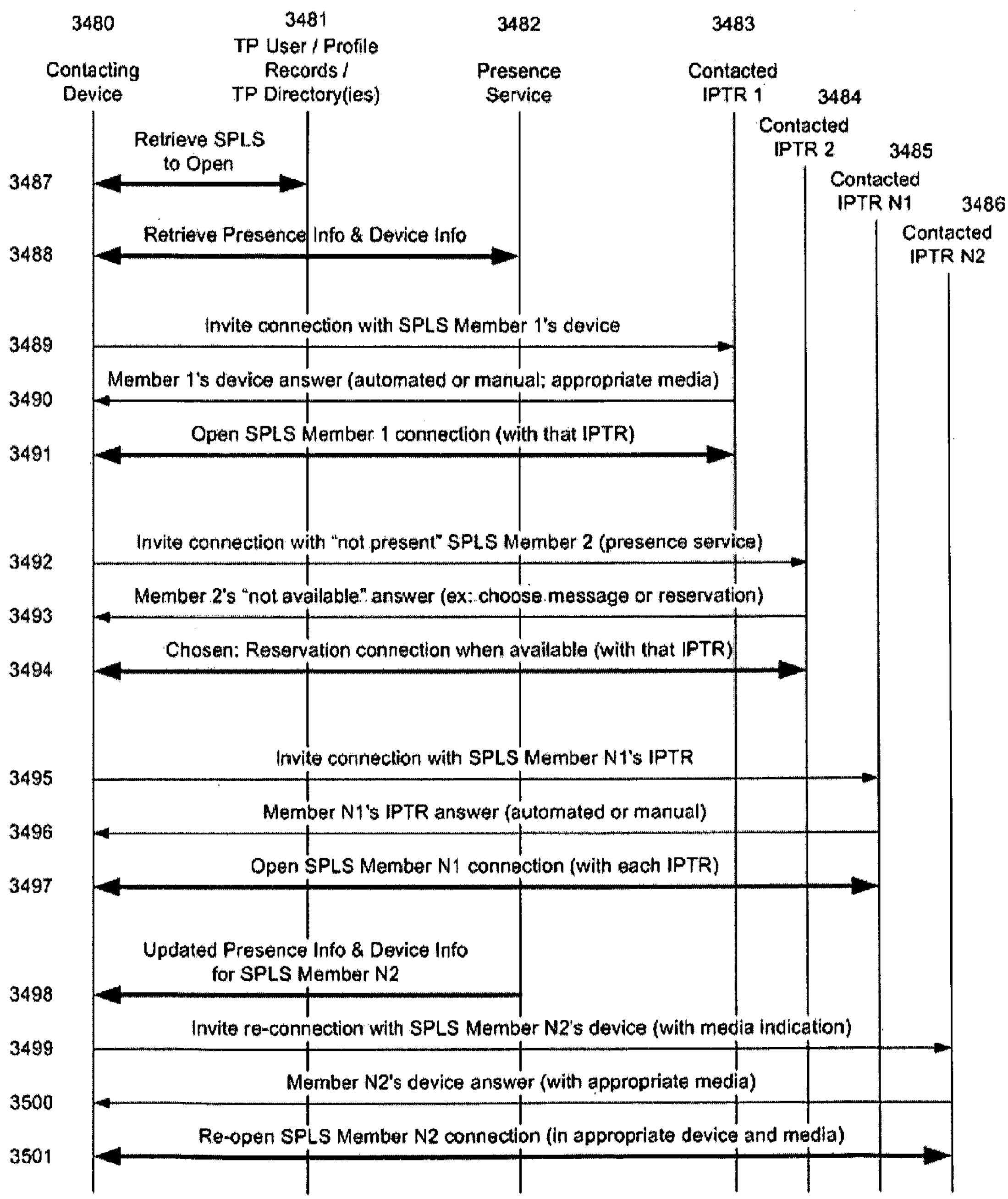
FIG. 76 is a diagram showing some examples of some TP connections steps with IPTR (identities, places, tools, resources, etc.).
Figure 77:
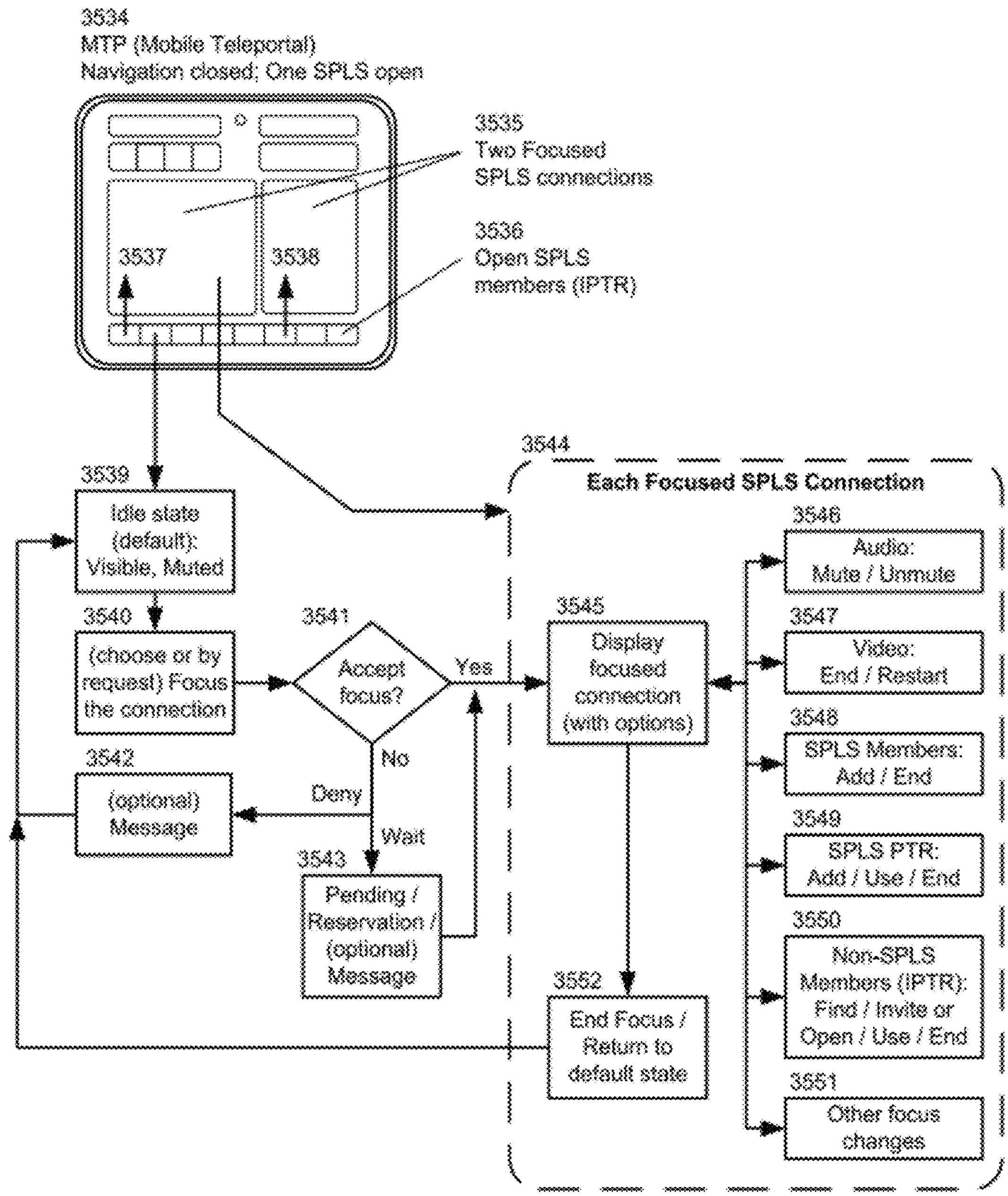
FIG. 77 is a pictorial diagram and flow chart showing the focusing of a TP connection.

FIGS. 74, 75, 76 and 77—TP Connection Service: A further object of the TPDP is to provide a TP Connection Service for "always on" connections that are opened automatically and/or manually by the selection and use of an identity(ies) and/or a device(s). In some examples this includes opening one or a plurality of SPLS's and each's connections, in some examples obtaining or updating the presence of identities (FIG. 74), in some examples focusing a connection (FIG. 74), in some examples opening a PTR connection (FIG. 75), in some examples focusing a connection with an IPTR (FIG. 76 and FIG. 77), in some examples changing a focused connection during its use (FIG. 77).

Figure 78:
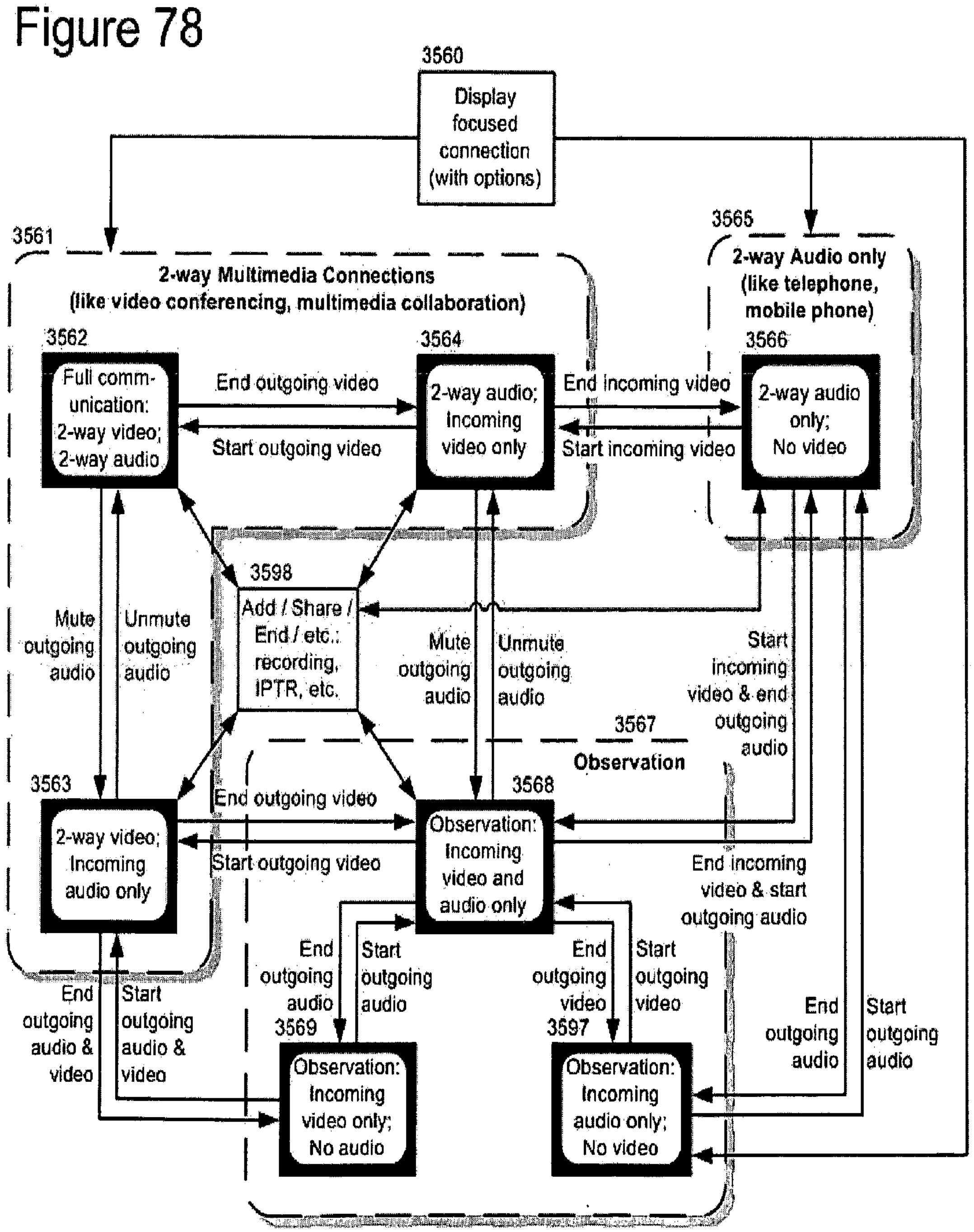
FIG. 78 is a block diagram that illustrates some examples of media options in a focused connection, or in some examples in SPLS connections.

FIG. 78—media in a focused connection: A further object of the TPDP is to provide a full range of media options in each focused connection within larger states such as 2-way multimedia connections, 2-way audio only connections, observation-only connections, etc.

Figure 79:
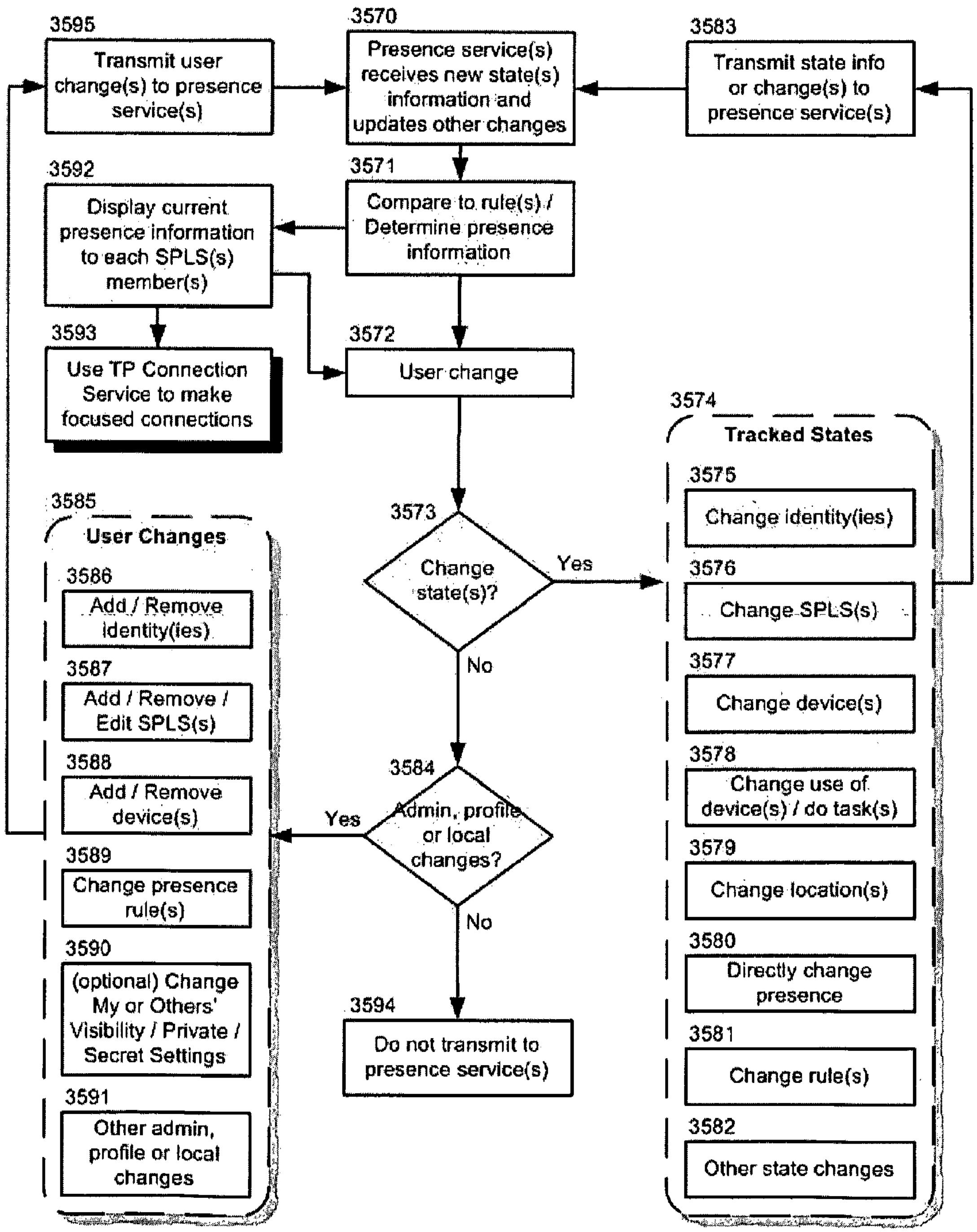
FIG. 79 is a flow chart showing some examples of dynamic presence awareness to make focused connections.

FIG. 79—dynamic presence awareness: A further object of the TPDP is to dynamically derive and distribute presence information from a user's normal activities with a variety of devices, tasks, etc. throughout a day—including changes in the user's state information in some examples as various tasks are performed, in some examples as various devices are used, in some examples as identity(ies) are changed, in some examples as SPLS's are changed, in some examples as location(s) are changed, or in some examples as other state changes occur. Similarly, a further object of the TPDP is to reflect and include users' administrative changes to various settings and/or rules when dynamically deriving and distributing presence information such as in some examples adding or removing identities, in some examples adding or removing SPLS's, in some examples adding or removing devices, in some examples changing presence rules, in some examples changing visibility and/or privacy settings, in some examples as other administrative or profile or other changes are made.

Figure 80:
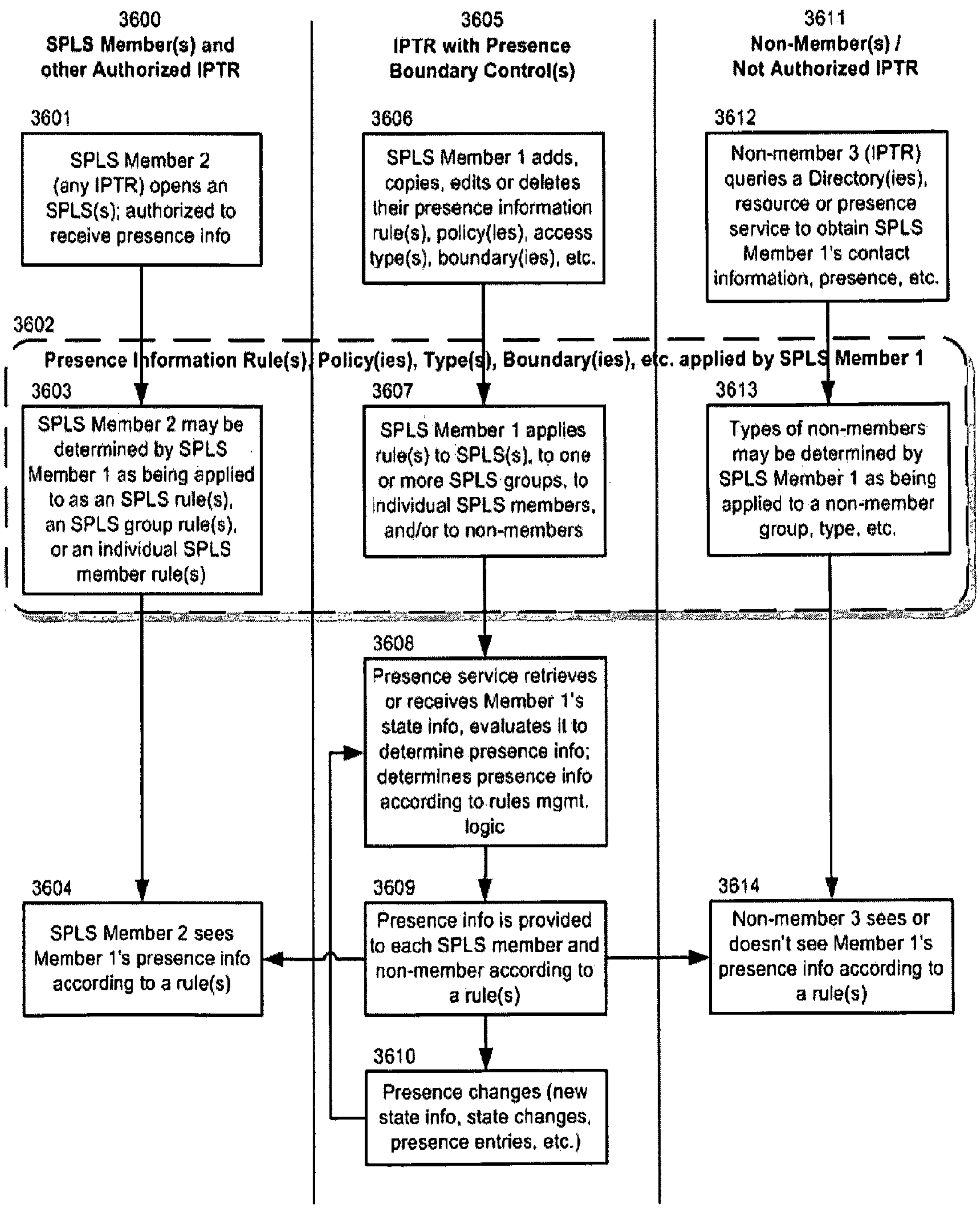
FIG. 80 is a block diagram that illustrates some examples of individual(s) control of presence boundary(ies).

FIG. 80—setting presence boundaries: A further object of the TPDP is to permit various IPTR to exercise different levels of control over the access to and display of their presence information by other IPTR—and some examples illustrate this based on IPTR choices that control presence information, rules, policies, access types, boundaries, etc.—so that these control means taken together may in some examples constitute a self-controlled Presence Boundary for each IPTR.

PRESENCE IN A PLACE: Together, FIGS. 81 through 85 illustrate some examples of presence by a plurality in a location, in some examples their presence in a place, in some examples their presence at an event, in some examples the interaction of individuals and/or groups at an event (or place), in some examples the combining of content and/or advertising with a focused connection and a group and a place, in some examples the real-time replacement of images of a real physical place(s) by digitally modified places (with or without providing information that a place has been modified), etc.

Figure 81:
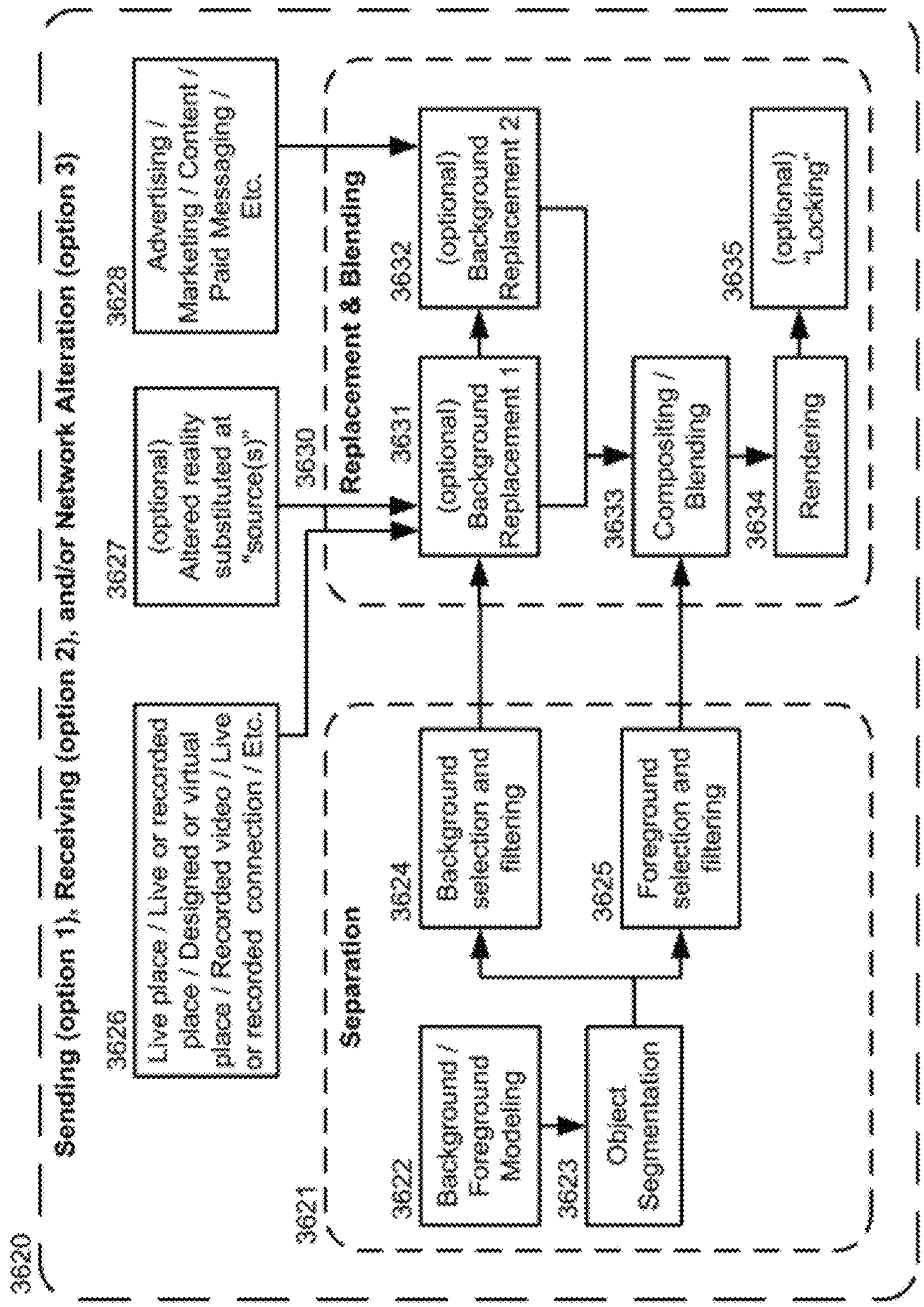
FIG. 81 is a block diagram that illustrates some examples of digitally combining TP presence and a place.

FIG. 81—replacing the background(s) in a focused connection: A further object of the TPDP is to combine a focused connection with a place, in which the background of a focused connection may be replaced in whole or in part in some examples by a place, in some examples by content (which may include advertising), etc. In some examples the place may be a remote location, in some examples the place may be the background of a participant in the focused connection, in some examples the background may be an event, etc. In some examples the background replacement(s) may include advertising or other content that is overlaid or replaced within the replaced background (so that a plurality of background replacements are made), in some examples the background may include a combination of a place and content that may include advertising, products, people, etc.

FIG. 82—example architecture for background replacement(s): A further object of the TPDP is to provide varied location options within an architecture wherein presence may be provided and background replacement(s) may be made. In some examples a sender may perform background replacement(s); in some examples a receiver may perform background replacement(s); in some examples a network resource may perform background replacement(s), and in some examples a plurality of individual and/or group background replacements may be performed at a plurality of locations by a plurality of devices which cause different participants to experience the same focused connection in some examples in the same place as each other, in some examples in a different place(s) from each other, in some examples with different advertising visible to each participant, in some examples with other individual or group differences, etc.

Figure 83:
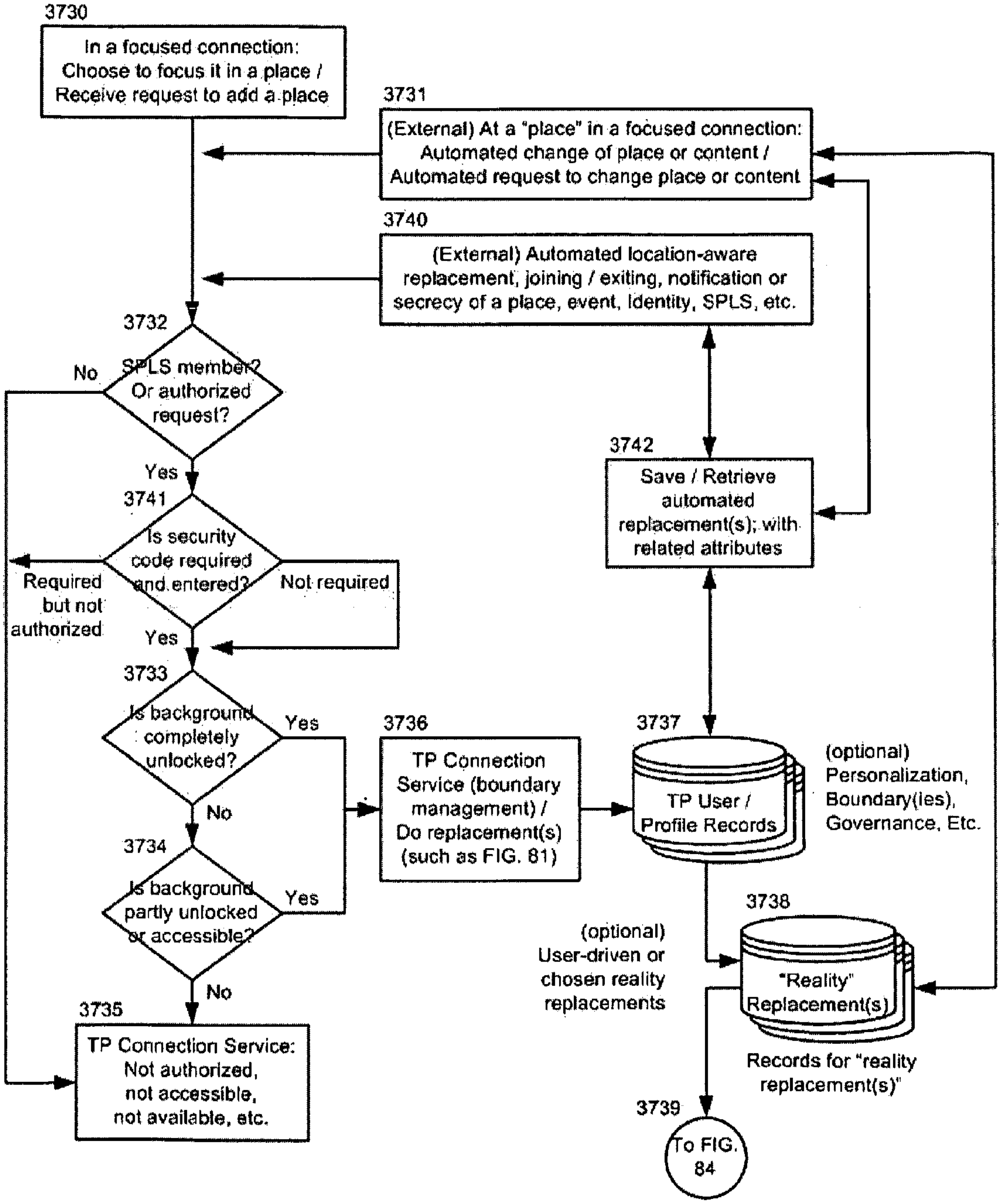
FIG. 83 is a flow chart showing some examples of procedures for TP addition of place(s) and/or content to a focused connection.
Figure 84:
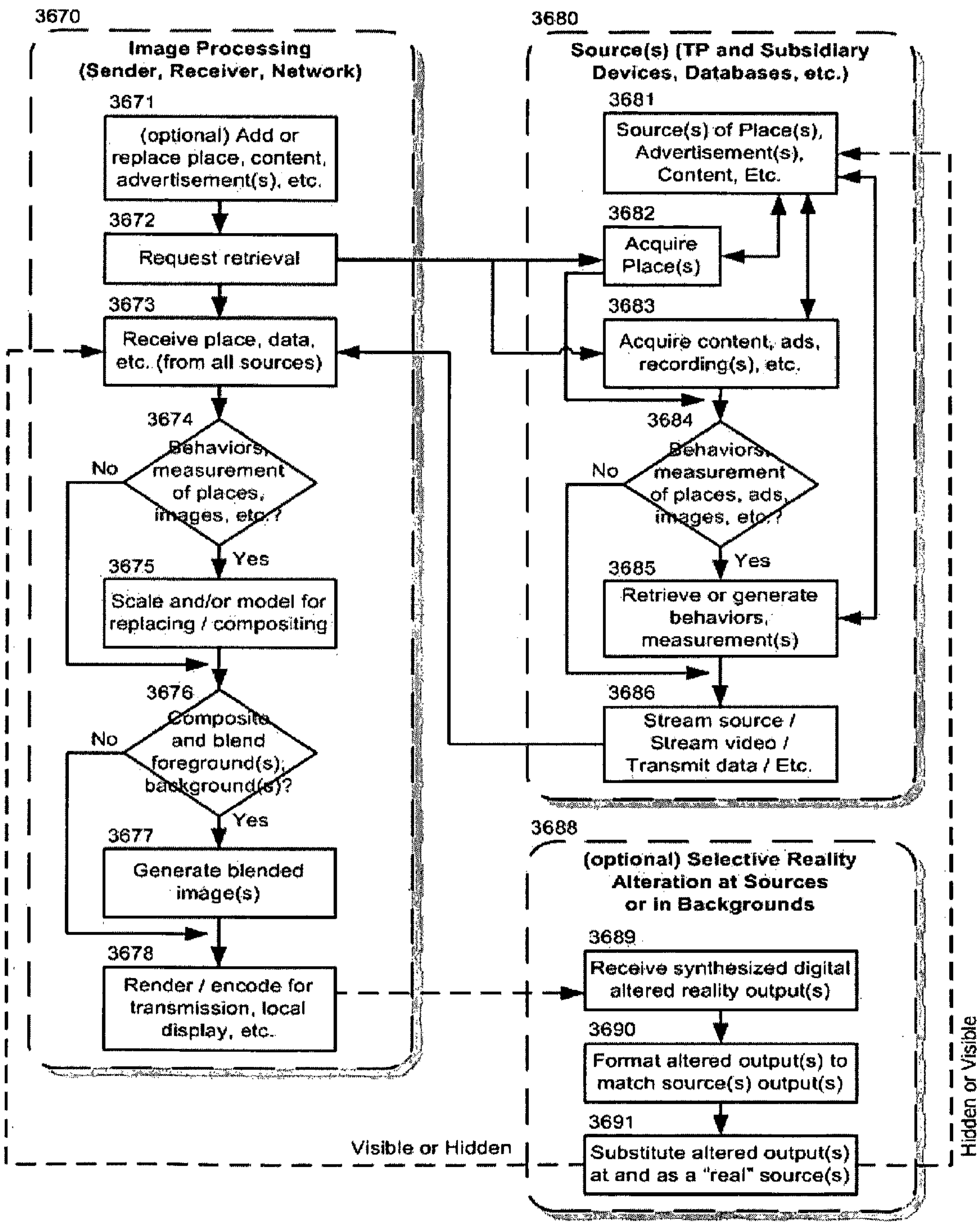
FIG. 84 is a flow chart showing some examples of procedures for the processing of a digital place(s).

FIGS. 83 and 84—example process for replacing background(s) and content: A further object of the TPDP is to provide means to replace backgrounds and content in focused connections in some examples by manual choice; in some examples by automated settings and processes; in some examples by location-awareness of a participant(s)'s physical location; in some examples by employing authorization(s) or security codes; in some examples by performing partial background replacements; in some examples by retrieving backgrounds and/or content from multiple resources or sources; in some examples by resizing and/or aligning multiple background components or content to fit each other appropriately; etc. In some examples they may include "reality replacement (s)" by altering the backgrounds or image(s) from sources as if the altered sources were real and unaltered (without providing information that these sources have been modified); etc.

In some examples "reality replacement" may be provided either by choice or as a business service, in some examples by replacing original source places without informing participants that said source replacements have been made; in some examples by a "reality replacement" business service(s) such as advertising replacements; in some examples location replacements for clients such as theme parks, travel visitors bureaus, etc.; in some examples product replacements or brand replacements for clients such as electronics vendors, fast food vendors, big-box stores chains, political parties or politicians, etc.; in some examples personal replacements for clients such as individuals who want to appear to have been in certain places at certain times; etc.

FIG. 85—events with scaled audiences, larger numbers of participants, etc.: A further object of the TPDP is to enable a plurality of business, education, entertainment, social services, etc. events (herein termed "events") to make it possible for a plurality of identities to attend an event, and/or interact at an event; with either complete, group and/or individual background replacement(s) and/or content replacements (including advertising). Some example events include education, news conferences, news events, government meetings, business presentations, synthesized realities (such as designed background replacements and/or with boundaries from a governance, nation state [country], corporation, religion, etc.), entertainment events, ticketed events, members-only events, etc. In some examples those who focus a connection at an event are audience members who are observers; in some examples those who focus a connection at an event are participants who may interact with each other while attending the event; etc. In some examples audience members or participants may view and/or identify all audience members who are present at an event; in some examples audience members or participants may filter an audience to show only members of their SPLS(s); in some examples audience members or participants may search an audience based on one or a plurality of attributes to locate those who match a desired identity and/or profile; in some examples audience members or participants may enter event information and/or event details that may be saved, stored and retrieved by others who are considering focusing a connection on said event; etc.

Figure 86:
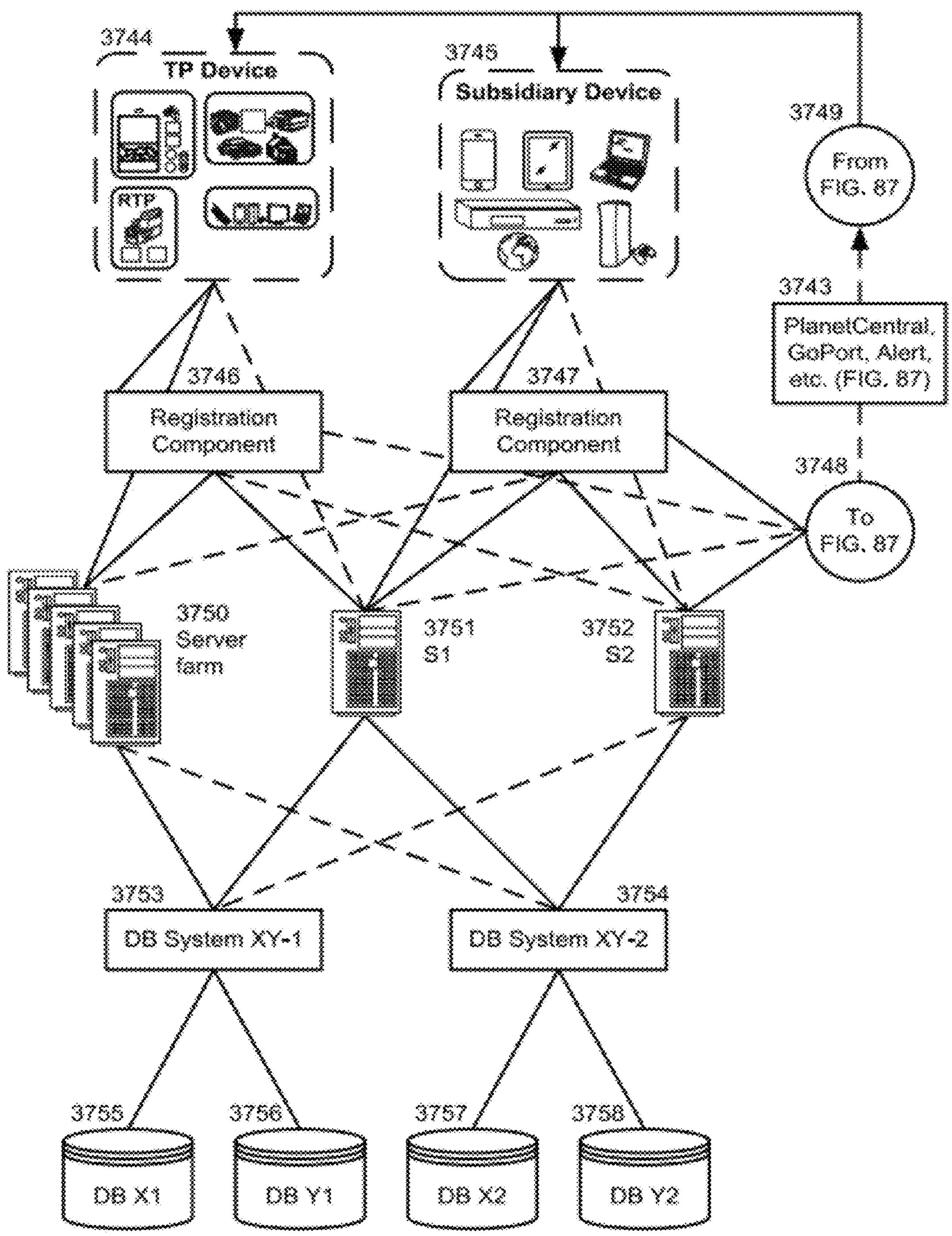
FIG. 86 is a block diagram illustrating scalability and fault tolerance for TP presence, TP resources, TP events, etc.

FIG. 86—scalable example architecture and/or fault tolerance: A further object of the TPDP is to provide means to scale a TPDP deployment, and/or provide fault tolerance in a TPDP deployment, so that one or a plurality of presence deployments may include larger presence services, continuity in case part of a presence system becomes unavailable, automated failover if a presence component fails, etc.

NEW "CURRENT EVENTS MEDIA": FIG. 87—TPDP as a "current events, places and digital realities media" to see and navigate a plurality of "current events, places, digital realities, streaming TP sources, etc." (including navigation by PlanetCentrals/GoPorts/Alerts/etc.): A further object of the TPDP is to provide means to aggregate the existence of TPDP events, places, digital realities, streaming TP sources(as described elsewhere) and in some examples provide a plurality of means to learn about them, in some examples provide means to find and/or navigate to them (such as in some examples by maps, in some examples by dashboards, in some examples by search, in some examples by categories, in some examples by lists, in some examples by API's for third-party applications, in some examples by API's for third-party services, in some examples by other types of navigation); in some examples by automated alerts and/or notifications of pre-selected types of events; in some examples by various broadcast media and/or social media that provide information and access to broadcasts, digital realities, streaming TP sources or events (or to categories of broadcasts, digital realities, streaming TP sources or events); etc. In some examples these may be named PlanetCentral(s), in some examples GoPort(s), in some examples alerts, or in some examples other names and interfaces may be utilized to make visible aggregated "current events, places and digital realities" as visible, accessible, navigable, connectable, and participatory by a plurality of others, users, audiences, members, subscribers, etc. In some examples a PlanetCentral, a GoPort, alert system, etc. may be provided as a native interface; in some examples a PlanetCentral, a GoPort, alert system, etc. may be a client(s), module(s), component(s), widget(s), etc. that may be provided by a separate application(s), service(s), network (s), portal(s), etc.

FIG. 87—joining free, paid and/or restricted events: A further object of the TPDP is to provide means to focus a connection after utilizing a PlanetCentral, a GoPort, alert system, etc. so that in some examples a free event may be focused directly; in some examples a paid event may require a ticket purchase prior to allowing a focused connection with the event; in some examples a restricted event may require submission of a membership, security code, credential, etc. before allowing a focused connection with the event; in some examples denying a focused connection if an event is paid or restricted and a ticket, membership, security code, etc. are not purchased or provided; etc.

Figure 88A:
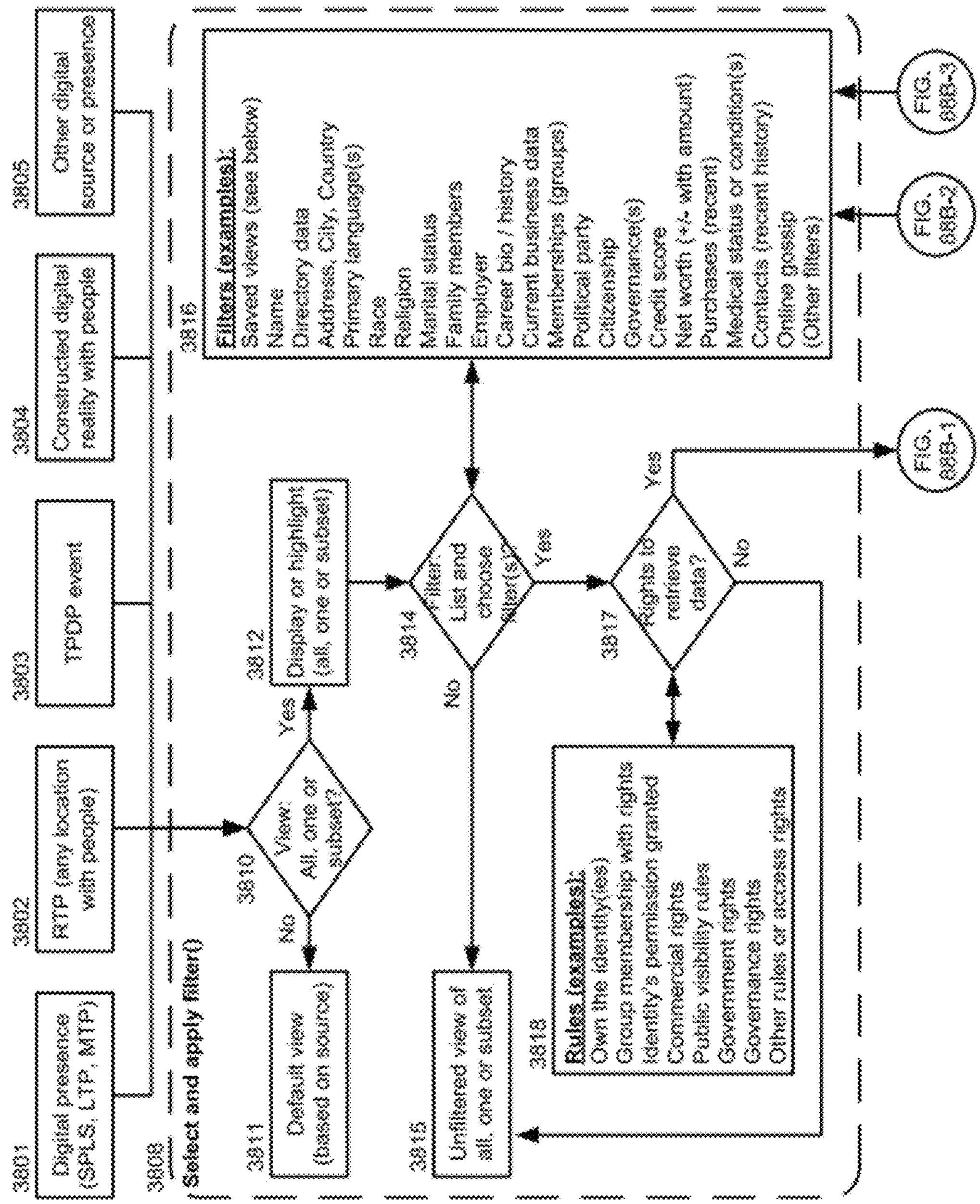
FIG. 88 is a flow chart showing some examples of procedures for filtering any digital presence with people such as in some examples a filtered display of only some people (based on a common attribute), and in some examples retrieving data (whatever is permitted from each request) on the people displayed based on a common attribute (such as name, address, credit score, net worth, etc.)
Figure 88B:
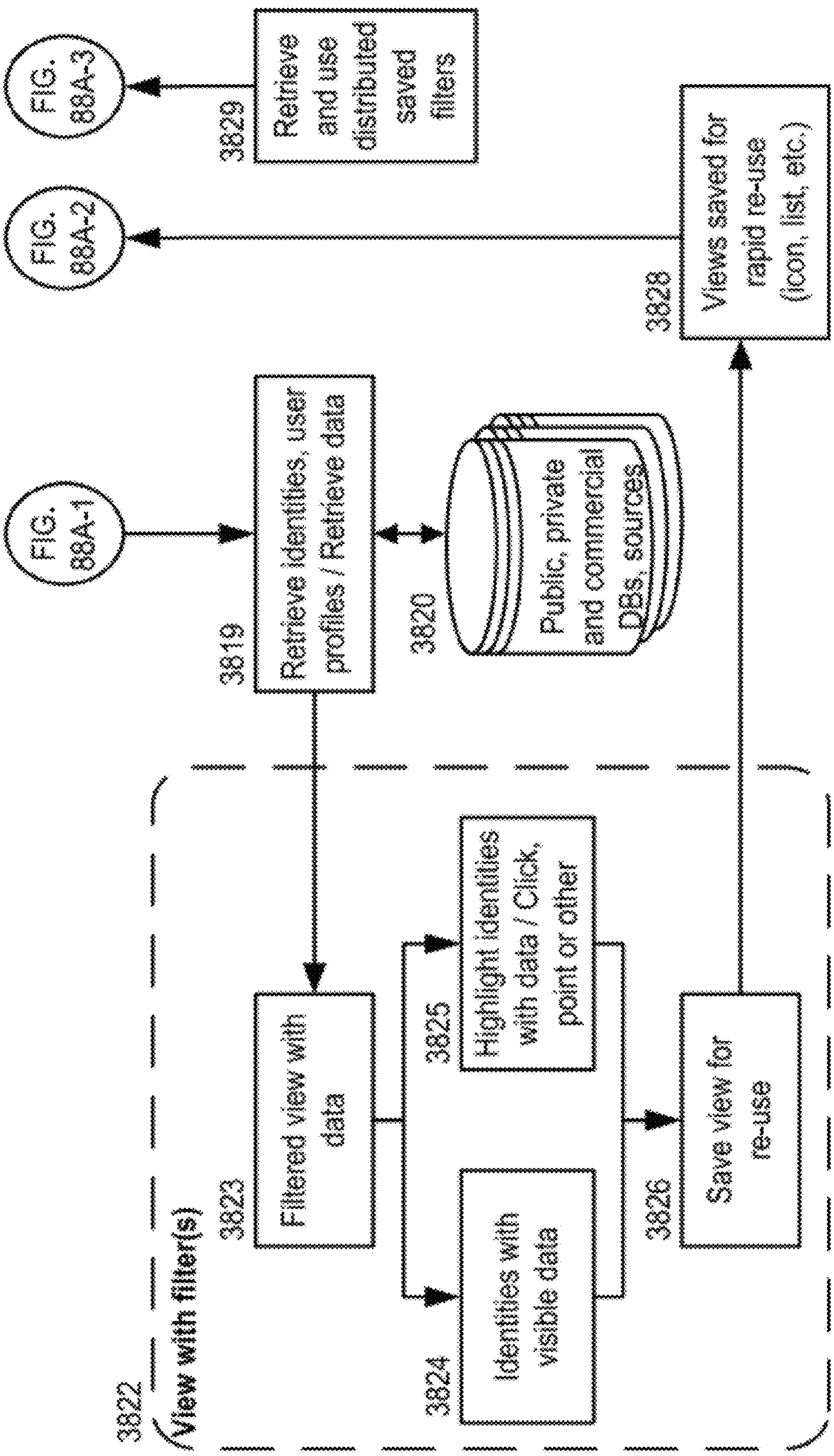

FIG. 88, "Filtered Places, Events, People, Etc.": In some examples a plurality of data on individuals is continuously collected and made available by numerous systems for users who have the right to retrieve, see and use it. Various parts of these available data are public records or data, private records or data, commercial records or data, governmental records or data, etc. Some data on individuals are available publicly for free, and some are available for purchase (from companies in the business of selling various types of data on individuals). In some examples a plurality of identifiable identities are digitally present in a virtual location and filters may be applied to determine the identities displayed, and in some examples data may be retrieved about each of them. In some examples one or a plurality of filters may be selected and applied to determine which identities are displayed and which are not displayed. In some examples one or a plurality of filters may be selected and applied to determine which data to retrieve about one or a plurality of identity(ies) displayed; in some examples said data retrieval may be permitted or denied based on access rights, rules, permission, authorization, payment for the data, etc.; and in some examples said retrieved data may be visible, and in some examples said retrieved data may be accessible by various interface means such as pointing, clicking, highlighting, voice commands, etc. In some examples a filtered view (with or without data retrieval/association with the displayed individuals) may be saved for re-use by the user who created it, and in some examples a filtered view may be saved and distributed for re-use by others.

This brief TPDP summary should make it clear that there may be a growing split between the physical world (which can only be reached or altered in limited ways) and TPDP digital reality(ies) that may be chosen, shaped, bounded and controlled in a growing number of individual and/or simultaneous ways, with a growing degree of reality and "accuracy", so that what is said to be "real" takes on increasingly different meanings depending on whether one means physical reality or TPDP digital reality(ies). As a result, the vision and practice of TPDP digital reality(ies) may grow until these are more powerful, more desirable and more "real" to some than a more local and more limited physical reality.

Privacy: Finally, privacy is not a TPDP issue within an SPLS because personal membership is voluntary, and each identity(ies)'s SPLS(s) may specify the information available to or from the SPLS, groups of SPLS members, and/or each individual SPLS member—with these levels of control TPDP privacy is what each person wants. In some examples an SPLS may be more public and include information such as in a personal directory listing like names, telephone numbers, street addresses, e-mail addresses, company, title, etc.—but not include private information such as current location, current device(s) in use, current activity(ies), Social Security numbers, financial accounts, drivers license numbers, etc. in other examples an SPLS may be more private such as an SPLS designed for financial management and this type of SPLS may include Social Security numbers, financial accounts, and the assets and/or liabilities in one or a plurality of financial accounts in addition to names, addresses, etc. In other words, each SPLS may include the types of information that are appropriate and commonly used for the purpose(s) of that SPLS, and where memberships are voluntary (whether in one's own SPLS's and/or as a member of other SPLS's) then the appropriate information is included because each individual permits or denies it. Outside of an SPLS privacy may or may not be considered a digital reality issue because various types of identifications (in some examples by an RTP, in some examples by face recognition, in some examples by physical or biometric identification, in some examples by association with a GPS-enabled device to which an identity is logged in, etc.) yield public information on the currently logged in identity(ies), and do not need to yield private or secret information on those who are identified. Similarly, in some examples an identification (such as a public RTP identification) does not yield information on a different identity or person that is not logged in. In some examples the range of public information on an identity may grow as that person engages in a wider range of public activities and creates a plurality of identities, but only public information may be accessed and retrieved about each identity—not its private or secret information. Furthermore, in some examples identifications are based on each person's current login(s) so if one wants to restrict one's information, one can choose to login with one or a plurality of public identities that provide the level of digital visibility wanted because one has taken the appropriate and available steps to manage those "public" identity(ies) visible and/or accessible information.

PERSONAL DIGITAL PRESENCE: Some examples of "Personal Digital Presence" are illustrated in FIG. 70 which begins with the person "Me" 3401. In some examples a first step is to select one or a plurality of "my" identities 3402 as exemplified elsewhere. In some examples a next step is to login as that selected identity(ies) on one or a plurality of TP devices 3403 (as exemplified elsewhere) such as an LTP, MTP, RTP, AID/AOD; or use devices that are connected to the AKM and are in my user profile. In some examples a next step is to login as that identity(ies) on one or a plurality of Subsidiary Devices 3404 (as exemplified elsewhere) by means of a VTP (Virtual Teleportal) or RCTP (Remote Control Teleportaling); which may include subsidiary devices such as a mobile phone, landline telephone, VOIP phone line, wearable computing device, PC, laptop, stationary Internet appliance, netbook, tablet, e-pad, mobile Internet appliance, online game system, Internet enabled television, television sets-top box, DVR, digital camera, surveillance camera, sensors (of many types; in some examples biometric sensors, in some examples personal health monitors, in some examples presence detectors, in some examples RFID-enabled identifiers, etc.), Web applications, websites, etc.

After login TPDP services are accessed by means of one network 3405 or by means of a plurality of networks 3405. In some examples these may include one or a combination of an IP network 3405 such as the Internet; a PSTN 3405 such as a telephone network; a cable network 3418 such as a combined cable television, Internet access and VOIP network; a TPN (Teleportal Network) 3418; or another type of network. In some examples the TPDP service (which is a component on one or a plurality of networks 3405) monitors state information derived from one or a plurality of logins 3402, and one or a plurality of uses of TP Devices 3403, Subsidiary Devices 3404, connected devices 3403 3404 registered in a user's profile, sensors 3404, AKM-connected devices 3403, etc. The state information may take many forms that are utilized by the TPDP system to determine the availability or presence of the user 3401 and/or identity(ies) 3402. In some examples a user controls his or her profile or other TPDP controls so that the user controls visibility, availability and use of presence information 3406 3407 3408. In some examples the TPDP service may provide user-selected availability and presence information such as different categories that each receive different presence information 3406 3407 3408. In some examples those categories may be different SPLS 3406 3407 3408, and in some examples those categories may be different groups within each SPLS 3406 3407 3408. In some examples the one or a plurality of identities 3401 3402 may open one or a plurality of SPLS, herein illustrated by A Personal SPLS 3406, a Work SPLS 3407, and Other SPLS 3408 of which the user and the user's devices are part. In some examples each SPLS may include Identities (people), Places, Tools, Resources, etc., which are named IPTR. In some examples a public identity 3402 may be selected and logging in as that public identity 3402 may automatically open one or a plurality of SPLS's 3406 3407 3408; but not open certain other SPLS's 3406 3407 3408 which may each require manual selection and opening. In some examples a private identity 3402 may be selected and logging in as that private identity 3402 may automatically open only one private SPLS; but not open any other SPLS connections 3406 3407 3408, so that every other individual connection by said private identity may require manual selection and opening. In some examples a secret identity 3402 may be selected and logging in as that secret identity 3402 may automatically forbid opening any SPLS's 3406 3407 3408; and in fact require every secret identity connection to be a manual selection and opening. In some examples, said user 3401 and identities 3402 may provide the same state information from logging in 3401 3402 and/or the use of TP Devices 3403, Subsidiary Devices 3404, and other state and availability indicators as described elsewhere; but different open, closed and only manually opened SPLS's 3406 3407 3408; or different IPTR members of the various open SPLS's 3406 3407 3408; may receive full, partial, different or no presence, availability, and/or use information as determined by each user 3401 or identity 3402.

In a personal digital presence example it is late evening on the East Coast and a user 3401 or identity 3402 may be using a Local Teleportal 3403 3409 and want a connection with a best friend from college—namely an identity 3406 in a personal SPLS 3406. Said identity 3401 3402 sees that the desired specific identity 3406, the college best friend, is present so focuses this connection 3409 which automatically includes its multiple audio, video, media attributes, and/or other features and functions. The best friend 3406 agrees to a focused connection 3409 and together they (optionally) select a place for the connection from the identity's 3402 personal SPLS 3406—namely, Big Sur, Calif. where the sun is currently setting 3409 so they can be connected while enjoying the sunset together 3409. In some examples all the individuals in a SPLS connection 3409 are included and visible in the display of the connection 3409. In some examples each person in a SPLS connection 3409, or each location (such as a family room with multiple participants) in a SPLS connection 3409, does not see himself or herself but rather sees only the other person(s) who are connected 3409. In some examples the participants may be dynamically scaled to their appropriate size for the place displayed 3409. In some examples the participants 3409 may be rendered as a user-selected avatar or icon. In some examples the place 3406 3409 may be a high definition live video. In some examples the place 3406 3409 may be a streaming video with or without audio. In some examples the place 3406 3409 may include stereo audio. In some examples the place 3406 3409 may include monaural audio. In some examples the place 3406 3409 may be a static image. In some examples the place 3406 3409 may be a series of occasionally changing images provided over low bandwidth. In some examples the place 3406 3409 may be rendered as an illustration of a virtual place. In some examples the place 3406 3409 may be rendered as an animation of a virtual place. In some examples various capabilities, features and characteristics of known virtual reality systems and methods may be employed.

COMMERCIAL DIGITAL PRESENCE: As the digital economy expands at an increasing scale, FIG. 71 "Multiple Digital Presences" provides some examples of varied ways that vendors may utilize SPLS connections for marketing and sales.

Today customers who want a direct sales experience are forced to get in a car and visit a mall, enter a big-box store, or schedule a product demonstration with a local salesperson—current websites do not provide the ability for vendor salespeople to sell directly to customers. This forces large expenses on vendors because they are forced to use sales channels like a chain of retail stores (with their associated inventory, logistics and cash flow requirements), or a local sales force in every local city to provide direct sales experiences. Instead, suppose it were possible to have a digital mall, a digital store, a digital show room, etc. that customers could visit personally—where vendor sales persons could assist them personally? This could allow customers and vendors to buy and sell directly without needing to build, run and stock a large number of stores that consume large amounts of energy and cost to fill this distribution pipeline—perhaps lowering the purchase prices of products that can be sold directly by virtual means without requiring the overhead cost of a local retail or sales channel.

Only a minority of vendors take advantage of customer visits to develop new products, learn valuable new customer needs, or retain existing customers. Currently customer visits require managers and product developers to take days from their work, use expensive travel and take a lot of customer time for each of their visits. A full customer visit program takes 2 to 3 dozen customers visits that utilize systematic inquiry, data collection and reporting—for one product category. When a large company has a large number of products to keep advancing and in sync with large markets, this is an insurmountable requirement that is an exception when it is done. Instead, suppose it were possible to have a 30-minute or 1-hour meeting that is actually a virtual visit at any number of customers? This could allow a vendor's key people to get close to its customers, learn the customers' perspectives, discover new ideas, and develop future products that are a better fit with the customers' needs.

In addition, a plurality of focused connections make it possible to combine various types of virtual commercial connections such as a virtual customer visit at that customer location by both a vendor's sales person and a potential customer. In such a customer visit the potential customer could see an actual installation of a vendor's product(s) and associated services, with direct connections to the current customer who can answer the potential customer's questions.

In some commerce examples various types of direct selling to customers may employ SPLS connections such as a visit to a digital store, a digital mall with multiple stores; or any type of digital meeting that includes customers and salespeople and/or products or services. Some examples are illustrated by FIG. 71, one of which is an MRI (Magnetic Resonance Imaging) facility 3422. This digital sales call in a MRI facility begins with a vendor 3414. In some examples a first step begins with a salesperson 3415 who may have one identity or a plurality of identities 3415 as exemplified elsewhere. In some examples a next step is for that salesperson 3415 to login as that identity 3415 on one or a plurality of TP Devices 3416 (as exemplified elsewhere) such as an LTP, MTP, RTP, AID/AOD; or use Devices that are connected to the AKM and are in that identity's user profile. In some examples a next step is to login as that identity 3415 on one or a plurality of Subsidiary Devices 3417 (as exemplified elsewhere), by means of a VTP or RCTP, which may include subsidiary devices such as a mobile phone, landline telephone, VOIP phone line, wearable computing device, PC, laptop, stationary Internet appliance, netbook, tablet, e-pad, mobile Internet appliance, online game system, Internet enabled television, television sets-top box, DVR, digital camera, surveillance camera, sensors (of many types; in some examples biometric sensors, in some examples personal health monitors, in some examples presence detectors, in some examples RFID-enabled identifiers, etc.), Web applications, websites, etc.

After login TPDP services are accessed by means of one network 3418 or by means of a plurality of networks 3418. In some examples these may include one or a combination of an IP network 3418 such as the Internet; a PSTN network 3418 such as a telephone network; a cable network 3418 such as a combined cable television, Internet access and VOIP network; a TPN (Teleportal Network) 3418; or another type of network. In some examples the TPDP service (which is a component on one or a plurality of networks 3418) monitors state information derived from one or a plurality of logins 3415, and one or a plurality of uses of TP Devices 3416, Subsidiary Devices 3417, connected devices 3416 3417 registered in a salesperson's user profile, sensors 3417, AKM-connected devices 3416, etc. The state information may take many forms that are utilized by the TPDP system to determine the availability or presence of the salesperson user 3415. In some examples a salesperson controls his or her profile or other TPDP controls so that the salesperson controls visibility, availability and use of presence information 3419 3420 3421. In some examples the vendor 3414 controls the salespersons' 3415 profiles or other TPDP controls so that the vendor controls the visibility, availability and use of its salespersons' presence information 3419 3420 3421. In some examples the SPLS members 3419 3420 3421 control the salespersons' 3415 presence, visibility, availability and use of its salespersons' presence information 3415. In some examples the TPDP service may provide selectable availability and presence information such as different categories that each receive different presence information 3419 3420 3421. In some examples those categories may be different SPLS 3419 3420 3421, and in some examples those categories may be different groups within each SPLS 3419 3420 3421. In some examples the one or a plurality of salespersons 3415 may open one or a plurality of SPLS, herein illustrated by a Customers SPLS 3419, a Marketing SPLS 3420, and a Sales Prospects SPLS 3421 of which the salespersons and the salespersons' devices are members. In some examples each SPLS 3419 3420 3421 may include Identities (people), Places, Tools, Resources, etc., which are named IPTR. In some examples a public salesperson identity 3415 may be selected and logging in as that salesperson identity 3415 may automatically open one or a plurality of SPLS's 3419 3420 3421; but not open certain other SPLS's 3419 3420 3421 which may each require manual selection and opening. In some examples a private salesperson's identity 3415 may be selected and logging in as that private identity 3415 may automatically open only one private SPLS; but not open any other SPLS connections 3419 3420 3421, so that every other individual connection by said private identity may require manual selection and opening. In some examples a secret identity 3415 may be selected and logging in as that secret identity 3415 may automatically forbid opening any SPLS's 3419 3420 3421; and in fact require every secret identity connection to be a manual selection and opening. In some examples, said salesperson 3415 may provide the same state information from logging in 3415 and/or the use of TP Devices 3416, Subsidiary Devices 3417, and other state and availability indicators as described elsewhere; but different open, closed and only manually opened SPLS's 3419 3420 3421; or different IPTR members of the various open SPLS's 3419 3420 3421; may receive full, partial, different or no presence, availability, and/or use information as determined by each salesperson 3415, by each vendor 3414, by each SPLS member 3419 3420 3421, or by the TPDP service.

In a commerce digital presence example a planned customer visit takes place in which an MRI (Magnetic Resonance Imaging) vendor 3414 sales person 3415, product manager 3415 and an engineer 3415 utilize one or a plurality of TP Devices 3416 and/or Subsidiary Devices 3417 to confirm presence and make an SPLS connection with a customer 3419 3422. They confirm the location is at the customer's MRI facility 3419 and add that Place to the connection 3422. MRI development engineers 3415 rarely if ever attend physical customer visits by traveling to customer MIR facilities, but can make virtual visits much more easily 3422. Said customer visits may ask broad questions (in some examples "If we could improve one thing about this MRI, what would be the most important improvement we should make?" or "What things does our competitors MRI's do better than us?" or "Is there anything about your MRI facility that keeps you awake at night?") or narrow questions (in some examples "We're thinking about changing feature X to work like this. Would you want that changed or not?" or "Our service plan could add online diagnosis and automatic fixes, but we're not sure if you want anything fixed automatically without your knowing about it first."). As these questions are asked the MRI customer could use the MRI equipment to make the answer clear, such as by showing an instrument's control or feature. After each visit the answers to a structured set of questions could be combined with those from other visits to provide systematic customer research inputs to the vendor's entire MRI group, along with the company's senior management. As a result of these visits both managers and engineers could then apply their new customer awareness when they make countless business and design decisions about what would be better or worse for the customers when they design the next generation of MRI equipment.

Similarly, one or a plurality of sales prospects 3421 could be invited to these customer visits 3422 whether by a salesperson 3415, by an MRI consultant (not shown), by a member of a professional association of MRI imaging doctors or professionals, or by others. These types of connections can be extended to operating MRI facilities so that "best practices" may be better developed by including more professionals in solving problems virtually, then share new advances virtually both faster and more widely than is possible when they must spread primarily by slow and infrequent physical contacts. In each case any participant may choose to include one or a plurality of additional IPTR such as from an available SPLS.

MOBILE DIGITAL PRESENCE: As the opportunity to work together virtually expands, FIG. 72 "Mobile Digital Presences" provides some examples of varied ways that vendors, customers and other types of professionals may utilize SPLS connections for solving problems, increasing capabilities, developing new knowledge and sharing it.

Today fixing a customer problem on-site usually means phoning or emailing customer service and having a voice or email exchange with a CSR (Customer Service Representative) who is in a call center. Done virtually it typically means visiting a support website and trying to find the problem listed, along with instructions for how to fix it. In some examples a company's employees are involved and they are trying to solve a problem while delivering a product or service and need to involve other employees who are not on-site. Instead, suppose it were possible to have a real-time virtual visit to the problem by the vendor's real people who were responsible for making their products run properly? This could allow customers and vendors to work together closely to make products more successful, and then include deeper knowledge of the problems and solutions in both the product's next design(s) and how the vendor operates.

Some mobile digital presence examples are illustrated by FIG. 72, one of which is during a delivery by a distribution company 3428 to a customer warehouse's receiving dock 3436. The distribution company 3428 has Transportation Managers 3429, truck drivers 3429 and other employees that are part of an internal Truck Fleet SPLS 3433. In some examples a first step begins with a truck driver 3429 who may have one identity or a plurality of identities 3429 as exemplified elsewhere, along with a transportation manager 3429 who may also have one identity or a plurality of identities 3429. In some examples a next step is for that truck driver 3429 and transportation manager 3429 to login as that identity 3429 on one or a plurality of TP Devices 3430 (as exemplified elsewhere) such as an LTP, MTP, RTP, AID/AOD; or use Devices that are connected to the AKM and are in those identities' user profiles. In some examples a next step is to login as those identities 3429 on one or a plurality of Subsidiary Devices 3431 (as exemplified elsewhere), by means of a VTP or RCTP, which may include subsidiary devices such as a mobile phone, landline telephone, VOIP phone line, wearable computing device, PC, laptop, stationary Internet appliance, netbook, tablet, e-pad, mobile Internet appliance, online game system, Internet enabled television, television sets-top box, DVR, digital camera, surveillance camera, sensors (of many types; in some examples biometric sensors, in some examples personal health monitors, in some examples presence detectors, in some examples RFID-enabled identifiers, etc.), Web applications, websites, etc.

After login TPDP services are accessed by means of one network 3432 or by means of a plurality of networks 3432. In some examples these may include one or a combination of an IP network 3432 such as the Internet; a PSTN network 3432 such as a telephone network; a cable network 3432 such as a combined cable television, Internet access and VOIP network; a TPN (Teleportal Network) 3432; or another type of network. In some examples the TPDP service (which is a component on one or a plurality of networks 3432) monitors state information derived from one or a plurality of logins 3429, and one or a plurality of uses of TP Devices 3430, Subsidiary Devices 3431, connected devices 3430 3431 registered in a salesperson's user profile, sensors 3431, AKM-connected devices 3430, etc. The state information may take many forms that are utilized by the TPDP system to determine the availability or presence of the truck driver and transportation manager 3429. In some examples the truck driver and/or transportation manager controls his or her profile or other TPDP controls so that the truck driver and/or transportation manager controls visibility, availability and use of presence information 3433 3434 3435. In some examples the distribution company 3428 controls the truck driver's and/or transportation manager's 3429 profiles or other TPDP controls so that the distributor controls the visibility, availability and use of the presence information 3433 3434 3435. In some examples the SPLS members 3433 3434 3435 control the truck driver's and/or transportation manager's 3429 presence, visibility, availability and use of their presence information 3415. In some examples the TPDP service may provide selectable availability and presence information such as different categories that each receive different presence information 3433 3434 3435. In some examples those categories may be different SPLS 3433 3434 3435, and in some examples those categories may be different groups within each SPLS 3433 3434 3435. In some examples the one or a plurality of the truck drivers and/or transportation manager 3429 may open one or a plurality of SPLS, herein illustrated by a Truck Fleet SPLS 3433, an Open SPLS for new deliveries 3434, and a Delivery Route SPLS 3435 of which the regular customers who receive shipments are members. In some examples each SPLS 3433 3434 3435 may include Identities (people), Places, Tools, Resources, etc., which are named IPTR. In some examples a truck driver's identity 3429 or a transportation manager's identity 3429 may be selected and logging in as that identity 3429 may automatically open one or a plurality of SPLS's 3433 3434 3435; but not open certain other SPLS's 3433 3434 3435 which may each require manual selection and opening. In some examples a private identity 3429 may be selected and logging in as that private identity 3429 may automatically open only one private SPLS; but not open any other other SPLS connections 3433 3434 3435, so that every other individual connection by said private identity may require manual selection and opening. In some examples a secret identity 3429 may be selected and logging in as that secret identity 3429 may automatically forbid opening any SPLS's 3433 3434 3435; and in fact require every secret identity connection to be a manual selection and opening. In some examples, said truck driver 3429 and/or transportation manager 3429 may provide the same state information from logging in 3429 and/or the use of TP Devices 3430, Subsidiary Devices 3431, and other state and availability indicators as described elsewhere; but different open, closed and only manually opened SPLS's 3433 3434 3435; or different IPTR members of the various open SPLS's 3433 3434 3435; may receive full, partial, different or no presence, availability, and/or use information as determined by each truck driver 3429, each transportation manager 3429, by each distributor 3428, by each SPLS member 3433 3434 3435, or by the TPDP service.

In a mobile digital presence example a truck driver 3429 may have a problem during a delivery at a customer's 3435 warehouse's loading dock 3435 in which a decision is required by the distribution company's transportation manager 3429, with input from an employee of the receiving customer 3435. In some examples the participants employ their SPLS's 3433 3435 to connect immediately 3436 at the customer's loading dock 3435 3436 by means of both stationary TP Devices 3430 and mobile TP Devices 3430. Said SPLS connection allows the participants to immediately deal with the specific issue that is simultaneously visible at the Place 3436 (the warehouse loading dock). During the discussion the customer 3435 or truck driver 3429 can use the Place visibility 3436 to point out the issues and solution options. The transportation manager 3429 could see the issues visibly and suggest a resolution immediately, which can also be agreed to immediately by the customer's employee 3435. In some examples other members of the employee's company 3435 may need to be included and they can join the SPLS connection immediately 3435 3436 regardless of their location. In some examples other employees of the distribution company 3428 3429 may need to be included and they can join the SPLS connection immediately 3429 3436 regardless of their location. In some examples documentation of the problem or solution may be needed and it can be generated immediately using SPLS Tools and Resources 3433 3435 and transmitted to the appropriate parties' TP devices 3430 3431 3433 3435, as well as logged in the appropriate distribution company's records. As a result of these SPLS connections both distributors 3428 and customers 3435 3434 could solve problems whenever and wherever they occur—as can other types of mobile digital needs.

Presence architecture example: Some examples of the ARTPM presence architecture are illustrated in FIG. 73. In some examples a presence system 3443 3449 3450 3451 3454 gathers a user's and/or an identity's state information from one or a plurality of sources 3440 3441 and/or devices 3440 3441 associated with said user/identity(ies) over one or a plurality of disparate networks 3442 throughout a normal day. In some examples one step is for a user to employ or interact with one or a plurality of TP Devices 3440 (as exemplified elsewhere) such as an LTP, MTP, RTP, AID/AOD; or use Devices that are connected to the AKM and are in a user's or identity's profile (as described elsewhere in detail); where appropriate sources are configured to provide the presence system with state information. In some examples a step is for a user to employ or interact with one or a plurality of Subsidiary Devices 3441 (as exemplified elsewhere) either directly and/or by means of a VTP (Virtual Teleportal) or RCTP (Remote Control Teleportaling); which may include subsidiary devices such as a mobile phone, landline telephone, VOIP phone line, wearable computing device, PC, laptop, enterprise business application, presence application, stationary Internet appliance, netbook, tablet, e-pad, mobile Internet appliance, online or network-connected game system, Internet enabled television, television set-top box, entertainment system, home theater system, DVR, digital camera, surveillance camera, sensors (of many types; in some examples biometric sensors, in some examples personal health monitors, in some examples presence detectors, in some examples RFID-enabled identifiers, in some examples wireless telemetry such as on a car or truck, etc.), Web applications, websites, etc.; where appropriate sources are configured to provide the presence system with state information. In some examples the configured sources may monitor their use and provide the presence system with state information automatically without the user directly entering availability, status or presence indicators. In some examples a user may provide the presence system with state information either indirectly or directly by means of a TP Device 3440 and/or a Subsidiary Device 3441. In some examples the presence system 3443 3449 3450 3451 3454 evaluates the user's and/or identity's state information from one or a plurality of sources 3440 3441 and creates presence information appropriate for different members 3452 3453 of one or a plurality of SPLS's. In some examples the state information gathered differs for each type of device 3440 3441 employed; such as in some examples a fixed device may not provide location information but may provide dynamic status or mode information based on its operation such as whether it is currently in use and busy or available for an immediate connection; such as in some examples a mobile device may also provide in-use state information but additionally provide dynamic location information received directly from a configured mobile device that is in motion; such as in some examples a wireless telemetry sensor in a vehicle combined with GPS (Global Positioning System) and other device state information may be employed to determine if a user is driving a vehicle; and in some examples the combination of state information from a user's multiple current devices and/or sensors may be evaluated such as to determine if the user is currently engaged or available for an immediate SPLS connection. In some mobile examples the mobile device 3440 3441 may receive the GPS coordinates, process the coordinates to determine the mobile device's location, and then provide said location; in some examples the mobile device 3440 3441 may receive the GPS coordinates and provide the GPS information so that a subsequent process may determine the mobile device's location; in some examples network triangulation techniques may be utilized to determine the mobile device's 3440 3441 location; in some examples the mobile device's 3440 3441 current location data, or in some examples the mobile device's location records, may be stored in a location database(s) 3450. In some examples the evaluation (s) may simply report the states of selected devices, or report presence or availability as indicated directly by a user; but in some examples the evaluation (s) may be complex analysis of state indicators from a plurality of devices and a user and/or identity(ies). In some examples a user-provided profile is employed to evaluate the state information, and the profile may indicate different categories of SPLS members for whom different presence information is appropriate, so the presence system creates and delivers the appropriate availability, status or presence to each different SPLS members 3452 3453. In some examples by means of a profile(s) 3454 and other means, a user may control delivery and use of presence information 3452 3453. In some examples the result is that the same state information from a user and/or identity(ies), with associated devices 3440 3441, forms the basis for different SPLS members to receive different availability, status or presence information 3452 3453. In any example the availability, status or presence information may include the best available current means for immediate SPLS connection(s) with said user and/or identity (ies)—which supports a focus on TPDP presence, which is a different focus from the current different products, differently operating devices, models, interfaces, and different services whose focus is on one communication at a time.

At a high level one or a plurality of presence systems 3443 is located on one or a plurality of networks 3442 in some examples an IP network 3442 such as the Internet, in some examples a Teleportal Network 3442, in some examples a PSTN 3442 such as a public switched telephone network, in some examples another type of network 3442 such as a cable television network which may be configured to provide state information when a set-top box or home entertainment system is in use, in some examples a cellular network 3442, in some examples a plurality of disparate networks 3442. On many of these disparate networks 3442 various devices, services, applications, etc. normally include configurations to communicate selected information (such as billing information) to one or more central applications, servers, locations, etc. and that central system may be a single point to configure for delivery of usage and other state information to a presence system 3443. In some examples a network's central server, system, application, etc. may be configured to utilize its monitoring of various devices and/or interactions to determine state changes, or it may simply receive the typical state transitions generated and reported by the network's devices. In some examples communication-enabled devices such as in the AKM may be configured to transmit state information that reflects user actions and/or interactions to the presence system 3443 whether directly or indirectly. These types of monitoring may also be added to wireless telemetry such as in vehicles, biometric devices such as for a health monitoring, and physical presence detector is such as for security or surveillance may also be employed to provide user state information for presence awareness. Another large class of frequently used devices relate to entertainment such as home theaters, game consoles, televisions, cable set top boxes, music stereo systems, etc. In some examples the communications environment 3442 may include a PSTN 3442, a public switched telephone network or a circuit-switched network. In some examples of a PSTN 3442 the switches may identify, provision and locate various telephony devices in the circuit-switched network 3442. In some examples one or a plurality of switches 3442 may be configured to provide telephony device state information to the presence system 3443, and this may include the telephony device's state, usage, dynamic location (if mobile), or a combination of these. In some examples a switch within a network 3442 may be configured to collect and provide state information to the presence system 3443 such as a device's status, state, location, mode, etc. In some examples it may be desirable to include a proxy server that represents one or a plurality of switches 3442 to the presence system 3443, which may provide benefits with certain communications or protocols. In a packet-based network a device's 3440 3441 state information is similar: in some examples a device 3440 3441 may be configured to provide state information automatically; in some examples a device 3440 3441 may be part of a network in which other components of the network may be configured to gather and provide state information on its associated devices; in some examples a switch within the network 3442 may be configured to collect and provide the state information to the present system 3443; in some examples a proxy server may represent one or a plurality of devices 3440 3441 and/or switches 3442 to the present system.

In some examples the presence system 3443 may be configured by a TP Device 3440, in some examples by a Subsidiary Device 3441, and in some examples by a plurality of TP Devices and Subsidiary Devices 3440 3441. Depending on the capabilities of each device 3440 3441 its user interface may include a microphone, speaker, camera, video display screen, and/or other multimedia interaction components as well as varied traditional keypad, mice, trackball, buttons, dials, etc.—said user interface may be configured to respond to voice commands, gestures, facial expressions, facial recognition, etc.

In some examples the presence system 3443 collects state information from configured devices 3440 3441. In some examples the presence system 3443 collects state information from users and/or identities 3445 when they enter it directly or indirectly in one or a plurality of the devices they are using 3440 3441 3446. In some examples the presence system 3443 derives presence information by processing the state information, and provides the presence information to SPLS members' SPLS presence interfaces 3452 3453 automatically. Each SPLS presence interface 3452 3453 is associated with an SPLS member's 3445 device(s) 3440 3441 3446 and it receives updated presence information automatically and/or upon request from the presence system 3443, as derived from state information associated with one or a plurality of other SPLS members 3452 3453 whose state information is collected and processed by the presence system 3443. In some examples the presence system 3443 accepts a user's and/or an identity's 3445 state information throughout the day as the user interacts with various connected and configured devices 3440 3441 3446. In some examples SPLS members 3445 and their associated devices 3440 3441 3446 are registered by the presence system 3443 as they change the use of their associated devices 3446. In some examples these uses include logging in or out of their associated devices 3440 3441 3446 with one or a plurality of different identities 3445. In some examples these uses include opening or closing each different and/or changing identity's 3445 associated SPLS's 3445. In some examples updates of the presence information may be provided upon request by individual SPLS members' 3445 SPLS presence interfaces 3452 3453. In some examples additional presence or state details may be provided upon request to individual SPLS members' 3445 SPLS presence interfaces 3452 3453. In some examples one or a plurality of SPLS members 3445 may have one or a plurality of SPLS's open 3452 3453 on one or a plurality of configured and connected devices 3440 3441 3446. In some examples each SPLS member's 3445 open SPLS(s) 3452 3453 receives the appropriate presence information on its SPLS presence interface based on state information associated with each member of the SPLS 3445.

In some examples the presence service collects state information and provides presence information independent of the access network employed 3442 or the respective TP Devices 3440 and/or Subsidiary Devices 3441 in use, so that a user may use one or a plurality of devices that preserve seamless access to continuous presence service even if the devices and network(s) involve mobility (whether location-specific such as by means of GPS, triangulation, etc.; or mobile without location-specific data). In some examples the presence service 3443 and/or configured devices 3440 3441 include event detection that detects device state changes and/or device mode changes whether at the device 3440 3441; at the device's network connection 3442; within the network 3442 such as at a switch, server, proxy server, etc.; or at the presence service 3443; such that said state and mode changes are received by the presence service. In some examples the presence service 3443 receives the status information across multiple communication networks and provides the presence information across multiple communication networks. Because a plurality of parties are members of the same SPLS, each party receives the other's presence information and vice-versa.

Presence delivery rules 3447 may also be applied by the presence system 3443 in some examples so that users and/or identities 3445 may control which presence information is delivered to SPLS members 3452 3453. In some examples one or a plurality of categories, profiles, groups, etc. 3454 may be established so that some SPLS members 3452 may obtain more or different presence information than other SPLS members 3453. In some examples one or a plurality of users and/or identities 3445 may establish one or a plurality of categories, profiles, groups, etc. 3454 which have different presence rules 3447. In some examples one or a plurality of SPLS members may be associated with a category, profile, group, etc. 3454. In some examples the presence system 3443 applies the different presence rules 3447 to provide different presence views for a given user and/or identity(ies) to the different SPLS members 3452 3453, which may vary by time, location, type of interaction, device(s) in use, category, profile, group, etc. In some examples each user and/or identity 3445 may implement rules 3447 that control visibility of their presence information based upon each SPLS member, a group or category of SPLS members, etc. 3454 3447. In the converse, SPLS members who receive presence information from others 3452 3453 3445 may also establish rules 3447 that identify each SPLS member, a group or category of SPLS members, etc. whose presence and visibility information is desired most; in some examples the SPLS members whose presence information is desired least; and in some examples the types of presence and visibility information they would like to see either at all times or immediately upon request. In some examples and on some types of networks 3442 there may be a need to relate logical and physical addresses of devices 3440 3441 that communicate with the presence system 3443, and this may be provided by means such as registration 3449. In some examples registration 3449 may be needed if there is a difference in device addresses such as between a logical address, a user address, a physical address, etc. In some examples registration 3449 may be applied to receive requests for presence information and authorize each request and, if authorized, provide both initial presence information 3445 3446 3447 and updated presence information 3445 3446 3447 as a user's or identity's presence changes. In some examples registration 3449 may be needed and applied to maintain awareness and readiness for connections with one or a plurality of a user's and/or an identity(ies)'s devices that are currently in use, whether for one user, a plurality of users, and/or a group(s) of users.

In some examples the presence system 3443 employs a control system 3443 that enables and carries out provisioning logic 3444, identity management logic 3445 (which controls and facilitates interactions with the subscribers' names and identities associated with their SPLS's), SPLS management logic 3445 (which controls and facilitates interactions with the individual Shared Planetary Life Spaces [SPLS] associated with their names and identities), device management logic 3446 (which controls and facilitates interactions with the configured devices that provide the presence service with state information; and controls and facilitates interactions with the devices that display presence information from the presence service), rules management logic 3447 (which is described elsewhere), and network interface(s) logic 3448 (which controls and facilitates communications with the network(s) with which the presence system communicates [including protocol conversion if required for communication with more than one network]). In some examples a user 3452 may open one or a plurality of TP Devices 3440 and/or Subsidiary Devices 3441 that are automatically and/or manually attached to one or a plurality of identities and therefore automatically and/or manually open one or a plurality of SPLS's. In some examples each open SPLS will subscribe to the presence service and receive current analyzed and evaluated presence information for one or a plurality of SPLS members via SPLS management logic 3445 and rules management logic 3447 such as the current presence of SPLS Member B 3453. Simultaneously, the presence service 3443 receives state information from the newly logged in user and/or identity 3452, including said user's devices in use 3440 3441; said state information is evaluated to determine presence information according to rules management logic 3447. Said presence information is delivered to one or a plurality of SPLS members 3453 according to SPLS management logic 3445 and rules management logic 3447; if appropriate, different SPLS members may receive different presence information from that one user 3452 according to each individual's and/or group's rules management logic settings 3447. In some examples interaction with devices that provide state information 3440 3441 is controlled by device management logic 3446; and in some examples this may (optionally) include provisioning 3444 configuration of one or a plurality of devices to employ a specified format and/or manner to provide the state information, with various provisioning data, configuration data, configuration applications, etc. stored and retrieved from a provisioning database(s) 3451. In some examples provision management logic 3444 supports provisioning the presence service as well as devices such as provisioning the identity management logic 3445, the SPLS management logic 3445, the device management logic 3446, and the rules management logic 3447. In some examples provisioning establishes a profile for a user and/or an identity that provides state and presence information; such as in some examples identifying monitored devices and each's respective states that will be monitored 3446; such as in some examples specifying rules to employ in evaluating state information to determine presence information 3447; such as in some examples specifying IPTR (identities, places, tools, resources, etc.) authorized to receive that user's and/or identity's presence information 3445. In some examples provisioning management logic 3444 is simplified by using predetermined categories so that a provisioning step may be associated with a category, wherein each category different rules for evaluating state information to provide different presence information to different SPLS members either as individuals or as groups.

In some examples the overall presence service process to disseminate presence information begins with a user ID in the presence service which in some examples may be automatically provided by a TP user ID 3454 whether a user has one or a plurality of identities; in some examples this may be established manually. In some examples a next step is for the presence system to access the user's and/or identity(ies)'s user profiles which in some examples may be automatically provided by the TP Utility 3454 (as described elsewhere); in some examples this may be provided by the AKM 3454 (as described elsewhere); in some examples this may be provided from other sources; in some examples an appropriate user profile may be established manually. In some examples a next step is for the presence system 3443 to utilize the profiles and stored provisioning data 3451 and configuration data 3451 to provision 3444 the presence system and the user's and/or identity(ies)'s devices 3446 3440 3441 so that the provisioned devices can provide state information and the presence system can receive it; in some examples the devices automatically supply status information on behalf of the user and or identity(ies); in some examples users may need to interact with the devices 3440 3441 and or with the presence system 3443 3444 3446 to configure the devices; in some examples users may need to interact with a network application, server, switch, etc. to which a device(s) is attached or communicates, to authorize status interactions between the device(s) and the presence system; in some examples the devices that provide state information are optimally configured to send state changes or mode changes that reflect the availability of the user (in some examples such as when a user begins or ends the use of any type of communication device that would produce a "busy" indicator or connection to messaging such as voicemail). In some examples a next step is to establish the presence service's rules 3447 for analyzing state information to provide presence information; in some examples these rules 3447 are provisioned automatically 3444 to estimate a user's or identity(ies)'s presence, availability, location, how to focus an immediate connection, etc.; in some examples these rules 3447 are pre-determined by category or group, and a user and/or identity(ies) merely assigns an entire SPLS, or groups of its members, to these pre-determined categories or groups; in some examples one or a plurality of these rules 3447 are manually configured by a user and or an identity(ies). In some examples the presence rules 3447 control the display of a given user's and/or identity(ies)'s presence information to others both within an SPLS 3452 3453 and/or outside of it; in some examples the presence rules 3447 control the display of other's presence information to that user and/or identity(ies); in some examples these rules are pre-determined and may be set up quickly with rapid and direct associations; in some examples a user and/or identity(ies) may manually establish one or a plurality of rules to control their visibility, what information about them is visible, how they should be connected with, etc. based on a particular state(s) of one or a combination of their devices. In some examples during use when state changes are received or detected, the state information is evaluated which in some examples will change the presence information and in some examples will not change the presence information; so if the presence information does not change then there is not a need to update the SPLS members' SPLS interfaces 3452 3453; however, if the presence information does change then there is a need to determine if a rule 3447 requires updating the presence information for all SPLS members 3452 3453, four certain categories or groups of an SPLS 3452 3453, or for specific individual SPLS members 3452 3453.

In some examples a user or an identity 3452 may request a presence update for a particular "target" IPTR (such as a specific identity) 3453 from the presence service 3443. In some examples the requesting user and/or requesting identity will already be connected to the presence service 3443 and have an open SPLS 3452 that indicates the current presence of the "target" identity 3453, and in some examples the requesting user and/or requesting identity will not be connected to the presence service 3443 and will first need to connect to it by means of opening and authorized device and SPLS. Once connected, the requesting user and/or requesting identity may make sure that the presence of the "target" user is current presence information; in some examples the requesting user sends a specific request to the presence service 3443, which receives the request for presence information from an interface means in the requesting user's SPLS interface 3452; after the presence service 3443 authorizes the request it polls the current states of the "target" identity's devices 3446 3454 3440 3441 which in some cases means interacting with one or a plurality of devices, and in some cases means utilizing the device state information previously received by the presence service 3443; after the available state information is received the rules management logic 3447 evaluates the state information which in some examples will change the "target" user's presence information and in some examples will not change the presence information; after the current presence 3453 is known the appropriate presence information is displayed to the requesting user 3452, which based upon the rules settings 3447 by both the requesting user 3452 and the "target" user 3453 may or may not permit displaying detailed presence information such as current GPS location, current devices in use, the state or mode of devices currently being used, etc.

In some examples an external presence-aware application 3455 and/or a presence-aware service 3456 may request the current presence of a particular "target" IPTR (such as a specific identity) 3452 3453 3454 from the presence service 3443 3449, in some examples the presence of a group and/or event may be requested from the presence service 3443 3449. In some examples the requesting presence-aware application 3455 and/or a presence-aware service 3456 will already be connected to the presence service 3443 3449 and in some examples the requesting presence-aware application 3455 and/or a presence-aware service 3456 will not be connected to the presence service 3443 and will first need to connect to it by authorized means such as logging in and opening an authorized connection. Once connected, the requesting presence-aware application 3455 and/or a presence-aware service 3456 may make a request for the current presence information of in some examples a "target" user, in some examples a group of users, in some examples a presence event, in some examples other types of presences; in some examples the requesting presence-aware application 3455 and/or a presence-aware service 3456 sends a specific request to the presence service 3443 3449, which receives the request for presence information; because this is an external request in some examples the authentication and authorization of this external request becomes important and more complex (as described elsewhere); after the presence service 3443 authorizes the request it polls the current states of the "target" identity's or identities' devices 3446 3449 3454 3440 3441 which in some cases means interacting with one or a plurality of devices, and in some cases means utilizing the device state information previously received by the presence service 3443 3449; after the available state information is received the rules management logic 3447 evaluates the state information to determine the "target" user's or users' presence information; after the current presence is known the appropriate presence information is communicated to the requesting presence-aware application 3455 and/or a presence-aware service 3456, which based upon the rules settings 3447 by both the requesting presence-aware application 3455 and/or a presence-aware service 3456 and by the "target" user 3453 or users 3452 3453, which may or may not permit communicating detailed presence information such as current GPS location, current devices in use, the state or mode of devices currently being used, etc. In some examples of presence there are one or a plurality of presence aware applications 3455 such as "PlanetCentral GoPort" 3457, or one or a plurality of presence aware services 3456 such as in some examples "PlanetCentral GoPort" 3457 (in which "PlanetCentral GoPort" is a presence-aware data access and navigation application and/or service that in some examples includes a presence navigation map 3457, in some examples includes a presence usage and navigation dashboard 3457, in some examples includes presence usage and navigation by top lists/top trends/fastest growing presences/fastest shrinking presences/presence event alerts/etc. 3457, in some examples includes presence search 3457, in some examples includes presence data access by means of an API 3457, in some examples includes other means to access presence data 3457; which is described in more detail elsewhere such as in FIG. 87, PlanetCentral, GoPort, etc.).

In an abbreviated and generalized summary, the presence service 3443 3449 collects, combines and evaluates state information from multiple devices 3440 3441 that are used throughout a day into one logical user presence indication that is displayed in an appropriate and different form and manner for various SPLS members and/or connections 3452 3453, and/or for various presence-aware applications 3455 or services 3456. This presence indication is updated as device state information is received, especially from state changes that are associated with the availability of a user.

TP connection service—introduction: The TPDP reverses the current "calling" paradigm for digital connections by making them "always on" with remote digital connections more important than local physical connections. When an automobile driver or a passenger sits in an automobile seat, the seat's passenger sensor fires billions of times during the life of the car so that each passenger's presence is constantly known and monitored—if an accident ever occurs the car's airbag system already knows what to do (in advanced airbag systems this may include how much to inflate each airbag based on the weight of each passenger and/or the severity of each impact). When billions of people carry a cell phone in their pocket the cell phone maintains a constant connection to a cell phone network including automatically switching to new cell towers as each person moves around throughout their day. In smart phones this may include maintaining constant GPS location awareness from GPS satellites orbiting the Earth or from triangulation between multiple cell towers. When anyone walks out on the street their eyes immediately see anything and everything at which they look.

We also live in a digital world of immediate usefulness, immediate presence, and immediate actions. When a car is in an accident are we willing to wait while an airbag system boots up, loads its software, connects to its multiple sensors and then determines what to do? When we take a cell phone out of our pocket to make a call, take a picture or obtain information about a local place, are we willing to wait while the cell phone boots up, loads its software, and connects to the communication network before we can use it? When we use a cell phone to obtain local information based on our personal location, are we willing to wait while the phone boots up, loads its software, triangulates our position based on the available GPS satellites? Walking into our digital reality is just as immediate as walking outside into the street: We're not willing to wait while our eyes and brain boot up, start processing what our eyes see, and then interpret what is in front of us. In the alternate reality of the ARTPM people do not enjoy stopping and waiting while a digital device boots up, loads software, forces login (whether by the user or by the device to a network), opens "our" connections, starts operating, requires a user to specify each connection individually, and only then makes each connection one at a time and slowly.

The TPDP reflects the way people behave in its alternate reality after a more realized digital transition 20 in FIG. 1: When we step into the ARTPM's digital environment we are fully connected, fully present, and ready for a wide range of actions, choices and events that may occur in one or a plurality of SPLS's (Shared Planetary Life Spaces) with their IPTR (Identities [people], Places, Tools, Resources, etc.). Our identity(ies) is logged in, our devices are on and connected, our SPLS's (Share Planetary Living Spaces) are open and connected, and we are ready and able to choose one or a plurality of our open connections as our focus for one or a plurality of uses, interactions, presences, services, actions, etc.

Figure 74:
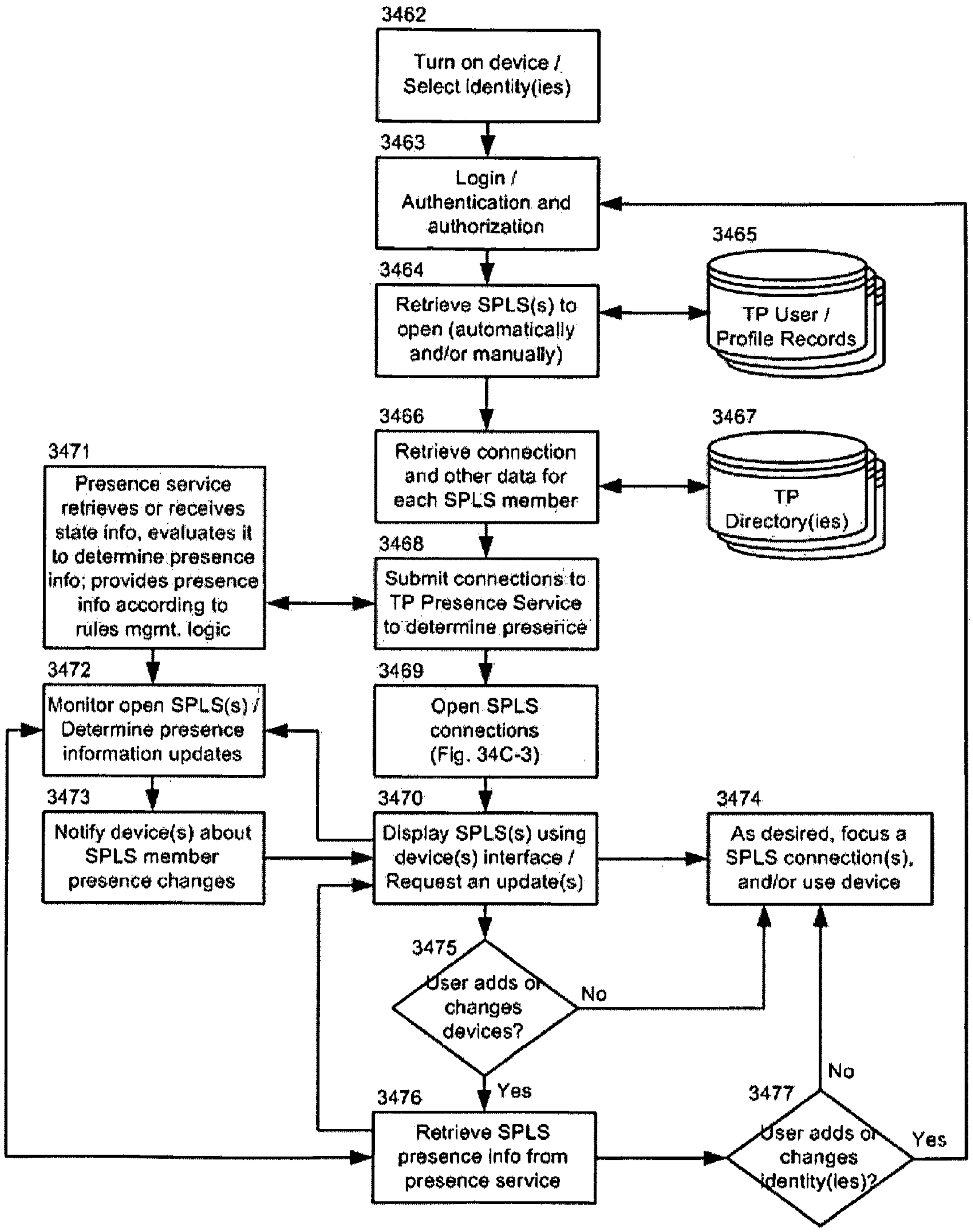
FIG. 74 is a flow chart showing some examples of procedures for TP connections (identities) including opening a Shared Planetary Life Space (SPLS).
Figure 75:
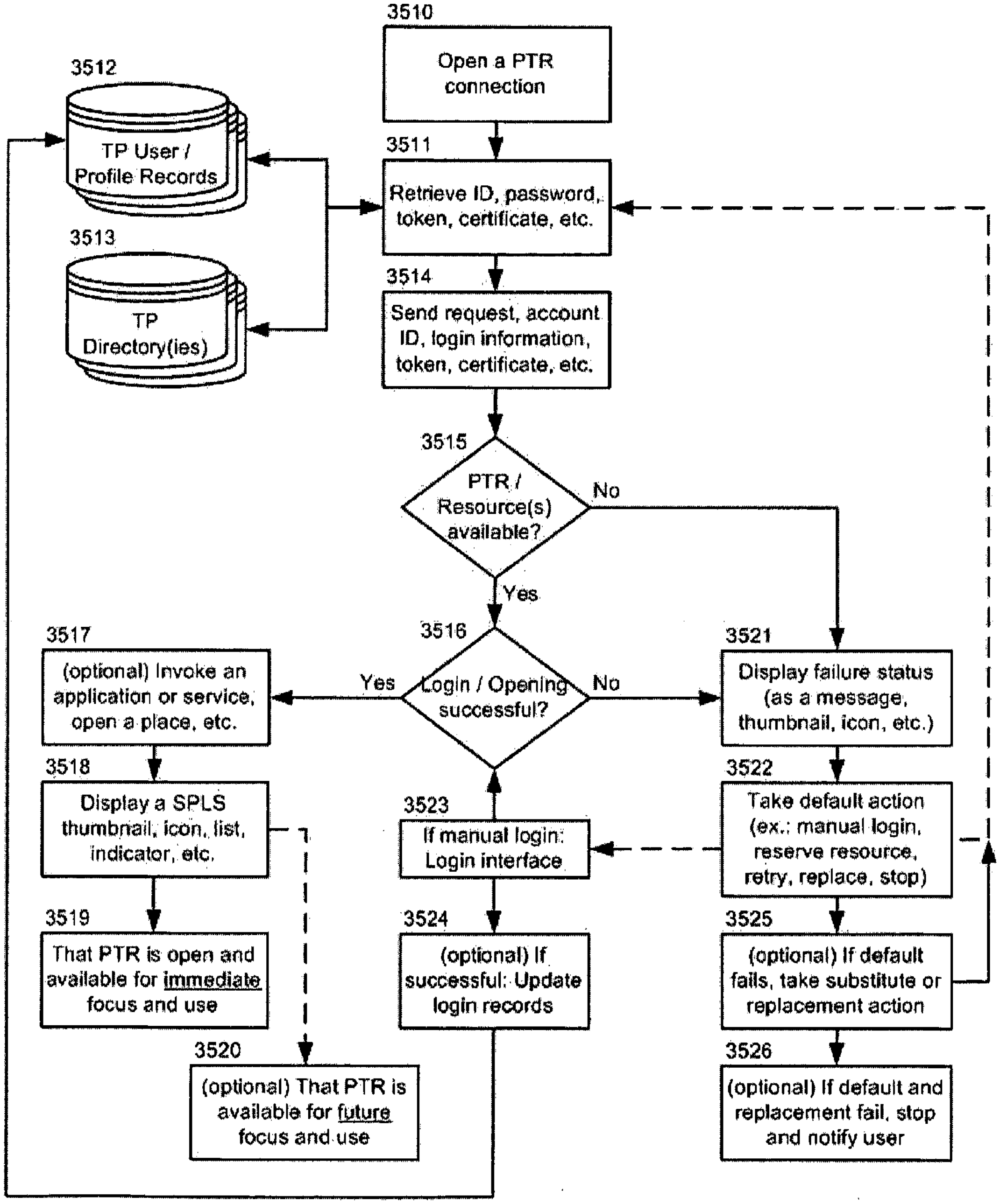
FIG. 75 is a flow chart showing some examples of procedures for TP connections to and opening PTR (places, tools, resources, etc.).

TP connection service—identities: Some identities examples of the TP Connection Service are illustrated in FIG. 74, "TP Connection Service—Identities." In some examples a user has one or a plurality of devices 3462 that have network communication (such as for transmitting and receiving data in digital or analog form over a network link such as a LAN, wireless, serial, parallel, etc.). After turning on one or a plurality of devices 3462 and selecting one or a plurality of identities 3462 in some examples said device(s) may be automatically logged on, authenticated and authorized 3463; in some examples said identity(ies) may be automatically logged on, authenticated and authorized 3463; in some examples said device(s) may require manual logon, authentication and authorization 3463; in some examples said identity(ies) may require manual logon, authentication and authorization 3463; in some examples said device(s) may have partly automated and partly manual logon, authentication and authorization 3463; in some examples said identity(ies) may have partly automated and partly manual logon, authentication and authorization 3463. After automated and/or manual device selection 3462, identity selection 3462, login 3463 authentication and authorization 3463, in some examples one or a plurality of SPLS's may be specified to be opened automatically 3464 and these SPLS(s) data are retrieved from one or a plurality of user/profile records databases 3465; in some examples one or a plurality of SPLS's may be specified to be opened manually 3464 and these SPLS(s) are presented to the logged in identity for selection and data retrieval from one or a plurality of user/profile records databases 3465. In some examples the database(s) 3465 are local; in some examples the database(s) 3465 are remote; in some examples the database(s) 3465 are part of a TP Utility; in some examples the database(s) 3465 are part of or are associated with a TP application; in some examples the database(s) 3465 are external to the ARTPM. In some examples the retrieved SPLS(s) include connection and other data 3464 3465 for each SPLS member; in some examples the retrieved SPLS(s) do not include connection and other data 3464 3465 for each SPLS member so this must be retrieved for one or a plurality of SPLS members 3466. In some examples where connection and other data for each SPLS member is needed this is retrieved from TP Directory(ies) 3467; in some examples where connection and other data for each SPLS member is needed this is retrieved from other directory(ies) 3467 that are external to the ARTPM. As described elsewhere in some examples a user may create one or a plurality of SPLS's that may optionally have disjoint or intersecting lists of members; in some examples each SPLS and/or groups within it may be labeled as each user desires; in some examples a user may edit one or a plurality of SPLS's whenever desired; in some examples a user may create one or a plurality of SPLS's whenever desired.

After retrieving SPLS member's connection and other data 3464 3465 3466 3467 in some examples appropriate SPLS member data is submitted to the TPDP Service 3468. In some examples registration 3449 in FIG. 73 may be applied to receive requests for presence information and authorize each request; in some examples authorization permits providing initial presence information; in some examples authorization permits providing updated presence information. In some examples said presence service 3471 retrieves or receives each SPLS member's state information 3471, evaluates it to determine each SPLS member's presence information, and determines said presence information according to rules management logic 3471 (as described elsewhere). In some examples said presence information 3471 is used to open appropriate and available SPLS connections 3469 (as described in FIG. 76 and elsewhere). In some examples the open and available SPLS connections 3469 are displayed using the current device(s)' interface 3470; while this interface may utilize the common and adaptive TP interface described elsewhere that UI design may employ any known techniques or methods to indicate user status and/or availability 3470: In some examples a focused live video with sound of an SPLS member is displayed 3470; in some examples live video thumbnails of the available SPLS members is displayed without sound 3470; in some examples a live video thumbnail of one or some selected SPLS members is displayed without sound 3470; in some examples a static live image of one or a plurality of SPLS members is displayed without sound 3470; in some examples an icon image of one or a plurality of SPLS members is displayed without sound 3470. Alternatively, any other techniques or methods may be used such as a list with attributes 3470 such as in some examples bolding a name to indicate current availability and graying a name to indicate unavailability 3470; in some examples using other symbols such as a checkmark to indicate current availability 3470; in some examples using a pair of symbols such as a "+" (plus) symbol to indicate availability and a "–" (minus) symbol to indicate unavailability 3470. Alternatively, other techniques or methods may include in some examples displaying only logged in SPLS members 3470; in some examples displaying an indicator to identify one or a plurality of recent logins, logouts or other status changes 3470. Alternatively, other techniques or methods may include in some examples "minimizing" [and hiding] an entire SPLS 3470 (such that the SPLS members are hidden until the SPLS is "maximized" and re-displayed); in some examples "minimizing" [and hiding] one or a plurality of groups within an SPLS 3470 (such that each minimize group's members are hidden until the group is "maximized" and re-displayed); in some examples displaying the number of currently available SPLS members next to an SPLS name 3470 such as "12" meaning 12 currently and immediately available SPLS members; in some examples displaying the number of currently available SPLS group members next to a group name 3470 such as "4" meaning 4 currently and immediately available group members; in some examples displaying the total number SPLS members and also the number of currently available SPLS members next to an SPLS name 3470 such as "12/24" meaning 12 currently and immediately available SPLS members out of 24 total SPLS members; in some examples displaying the total number group members and also the number of currently available group members next to a group name 3470 such as "4/6" meaning 4 currently and immediately available group members out of 6 total group members. In each case the presence information provided as the default is according to the presence service's rules management (as described elsewhere), and may be expanded by requesting more and/or all available user or presence information that is permitted to be provided. In addition, in some examples the current presence information may be updated upon request for one or a plurality of SPLS members 3470 by selecting said SPLS member(s) and requesting an update from the presence service 3472 3471, which then notifies the requesting device 3473 about the current presence information.

In some examples the presence service 3472 monitors device(s) state information for each SPLS member from uses throughout a day as described elsewhere, in some examples including a plurality of sources that are configured to provide state changes, mode changes and/or state status information over a plurality of disparate networks. In some examples normal user interactions with devices automatically provides resulting state changes and state information to the presence service without the user entering or providing status information or availability, such that the presence service may evaluate the state information from one or a plurality of sources to derive presence information to deliver 3473 by notifying devices 3470 about SPLS member changes in presence and availability. Said changes in presence 3472 3473 are displayed 3470 by means and interfaces described elsewhere. In addition, in some examples the current display may be updated upon request by utilizing a local or remote contact list, other SPLS list(s), a TP Directory(ies), another directory (ies), or other source to identify one or a plurality of users or identities and requesting an update from the presence service 3472 3471, which then notifies the requesting device 3473 about the current presence information for said requested identity(ies).

In some examples a user may decide to employ more than one device simultaneously while retaining the same identity (ies) 3475 by adding one or a plurality of devices 3475, or by changing from one device(s) to another device(s) 3475. In this case, in some examples the user's added device 3475 3476 and/or changed device 3475 3476 would be provided seamless access to their open SPLS(s) 3469, with continuous presence information 3471 3472. Said continuous presence information 3471 3472 would be received by the new device 3476 retrieving the existing current SPLS presence information from the presence service 3472 that would be displayed on the interface of the added device 3475 3476 3470, or on the interface of the changed device 3475 3476 3470; in some examples continuous presence updates 3472 3473 would also be received without interruption on the interface of the added device 3470 or the interface of the changed device 3470.

In some examples a user may decide to change one or a plurality of identities while using the same device(s) 3477 by adding one or a plurality of identities 3477, or by changing from one identity(ies) to another identity(ies) 3477. In this case, in some examples the user's added or changed identity (ies) 3477 would repeat the above process for login 3463, authentication and authorization 3463, SPLS retrieval 3464 3465, connection data retrieval 3466 3467, presence determination 3468 3471 and other steps as described elsewhere. Said presence information 3471 3472 would be received by the new identity(ies) 3477 that would be displayed on the interface of the associated device(s) 3470. In some examples continuous presence updates 3472 3473 would also be received by the new identity(ies) 3477 and displayed on the interface of the associated device(s) 3470.

In each case—such as an initial device(s) opening 3469, the addition of a new device(s) by an identity 3475, changing from one device(s) to another device(s) by an identity 3475, the addition of a new identity(ies) to a current device 3477, the changing of an identity(ies) on a current device 3477, or any other additions or changes—the device(s) 3470 may be used in some examples to focus an SPLS connection 3474, in some examples to use the device 3470 in other ways 3474, in some examples to use the presence information 3472 or presence updates 3473, etc.

TP connection service—PTR (Places, Tools, Resources, Etc.): In some examples a device is turned on 3462, in some examples one or a plurality of identityies are selected 3462, and in some examples one or a plurality of SPLS's are opened automatically 3464 and/or in some examples one or a plurality of SPLS's are selected manually for automated opening 3464. When one or a plurality of the SPLS members are PTR (Places, Tools, Resources, etc.), users of computerized communications devices and networks in the alternate reality expect automated logons and startups so that their digital environment is immediately open and available, and some examples of this are in FIG. 75, "TP Connection Service—PTR (Places, Tools, Resources, etc.)." Familiar examples from the current reality include the billions of cell phones that simply connect to a communications network for immediate use as soon as they are turned on and then kept ready as the phones move and connect with new cell towers, and billions of PC's with always-on Internet connections where users simply run a browser with Google as the homepage so they can instantly display almost anything they need. As described elsewhere in some examples a step in this process is to retrieve connection and other data 3464 3465 3466 3467 3511 3512 3513 such as each PTR's login information (in some examples retrieved data may include username, user ID, account ID, password, PTR name, PTR address, token, certificate, etc.); in some examples where connection and/or other data for one or a plurality of SPLS PTR members are needed these are retrieved from other directory(ies) 3467 or from sources external to the ARTPM.

Whether the request is to open the PTR connection for immediate focus and use 3519, or to open it for rapid use in the future 3520, in some examples the same process is used including invoking the PTR by sending the appropriate connection information for each PTR 3514 such as in some examples a request 3514, in some examples an account ID 3514, in some examples login information 3514, in some examples a token 3514, in some examples a certificate 3514, etc. to invoke the PTR. If the resource is available 3515 login proceeds 3516 such as in some examples by providing the resource 3516, in some examples authenticating and authorizing the user login 3516, in some examples authenticating and authorizing the device 3516, in some examples authenticating and authorizing a token or credential 3516, etc. Once the request or login is accepted 3516 the PTR is invoked 3517 such as in some examples by opening a Place 3517; in some examples by invoking an application 3517, in some examples by providing a service 3517, in some examples by opening or invoking a Tool or Resource 3517, etc. Since the PTR is platform independent and network independent, in some examples it may run on or be provided by any platform or network with which the device may communicate, in some examples with which the TP Utility may communicate, and some examples with which the Internet may communicate, etc. The PTR is then displayed using the current device(s)' interface 3518; while this interface may utilize the common and adaptive TP interface described elsewhere that UI may employ any known techniques or methods to indicate user status and/or availability 3518 as described elsewhere. In some examples the PTR is opened for immediate use 3519 in which case the invoked PTR 3516 3517 is open and available for immediate focus and use at any time until it is disconnected. In some examples the PTR is opened for future use 3520 in which case the invoked PTR 3516 3517 is opened successfully but then put in a logout state with the appropriate connection information 3511 3514 retained for immediate and automated re-login 3516 to re-invoke the PTR 3517 as soon as it is needed for focus and use.

In some examples one or a plurality of the PTR is not available 3515 in which case a failure message 3521 and adjustment process may be utilized 3522 3523 3524 3525 3526. In some examples one or a plurality of the PTR may not be successfully logged into 3516 or successfully invoked 3517 in either of which case a failure message 3521 and adjustment process may be utilized 3522 3523 3524 3525 3526. In some examples the failure message 3521 and adjustment process 3522 3523 3524 3525 3526 begins by failure messaging 3521 which in some examples may utilize a visible text message 3521; in some examples may utilize an audible sound(s) 3521; in some examples may utilize a verbal audible message 3521; in some examples may utilize in indicator such as the universal stop sign or a bold red X displayed over that PTR's indicator 3521; in some examples may utilize any known interface technique or method to show non-availability as described elsewhere 3521; in some examples may utilize a combination of these messages, interface techniques and indicators 3521. In some examples the adjustment process may then take a default action 3522 either automatically 3522 or by first displaying a proposed action and requesting manual user approval before it is taken 3522. In some examples the default adjustment action 3522 may be to manually access the PTR 3523 such as in some examples by displaying the PTR's login interface 3523 for a manual login 3523. In some examples the user logs in manually 3523 and the login is successful 3516, in which case the process returns to what was previously automated 3517 3518 whether that includes having that PTR open and available for immediate focus and use 3519 or whether that includes having that PTR available for future focus and use 3520. In some examples the user logs in manually 3523 and the login is successful 3516, in which case the login information is (optionally) used to update that PTR's login records 3524 by storing it in the TP User/Profile Records 3512 for use during future SPLS opening of that PTR connection 3510 3511 3512 3513 3514 3515 3516 3517. In some examples the adjustment process may take a different default action 3522 which in some examples is to reserve that PTR resource 3522 3515 then when it becomes available invoke it 3517 3518 and open it for immediate focus and use 3519 or for future focus in use 3520; which in some examples is to automatically periodically retry accessing and invoking said PTR 3516 3517; which in some examples is to replace said PTR with a different pre-selected PTR 3522 3511 in which case the pre-selected PTR is accessed and invoked 3511 3512 3513 3514 3515 3516 3517 as described elsewhere, or if unsuccessful has a failure message displayed 3521 and an adjustment process utilized 3522 3523 3524 3525 3526 as described elsewhere; which in some examples is to take a default action 3522 that does not succeed 3521 3522 and then utilize a replacement PTR 3525 3511 3512 3513 3514 3515 3516 3517; which in some examples the default action 3522 may fail, a replacement PTR 3525 is not pre-selected, a replacement PTR 3525 3511 3512 3513 3514 3515 3516 is not accessed successfully 3521, in which case the PTR connection process stops 3526 and the user is (optionally) notified 3526. In sum, in some examples the TP Connection Service FIG. 75 includes PTR (Places, Tools, Resources, etc.) as part of automatically or manually opening an SPLS digital environment for immediate focus and use 3519, and/or for future focus and use 3520.

TP connection service—IPTR (Identities, Places, Tools, Resources, Etc.): Turning now to FIG. 76, "TP Connection Service—IPTR," some examples of establishing multiple open SPLS connections are illustrated by means of known and new messaging and communication processes. These include in some examples the contacting device 3480; in some examples TP User/Profile Records 3481; in some examples TP Directory(ies) 3481; in some examples other profiles, directories and sources 3481; in some examples a presence service 3482; and in some examples various IPTR (Identities [persons], Places, Tools, Resources, etc.) herein represented as contacted IPTR 1 3483, contacted IPTR 2 3484, contacted IPTR N1 3485, and contacted IPTR N2 3486. As described elsewhere in some examples a device, identity (ies) and/or SPLS's are selected and an SPLS is retrieved to open 3487, which are utilized to retrieve the SPLS data required to open its connections 3481 from TP User/Profile Records 3481; TP Directory(ies) 3481; and/or other external directories, profiles and sources 3481. In addition presence information 3488 is retrieved from a presence service 3482, along with current device information 3488 based on the presence information 3488, so the respective SPLS connections may be established by means of the SPLS data retrieved 3487.

Following the initial steps 3487 3488 in some examples the device and/or client is ready to focus an SPLS connection(s). The following flow parallels the SIP protocol in which a communication request is called an "invite" and this message delivers the content of a connection and communication request; if the connection is accepted an "answer" message contains the reply (such as in some examples a network identifier for the receiving device); if the connection is not accepted a "not available" may be sent (such as an automated or manual choice between reserving an automatic connection when available again, or leaving a message) or alternatively a "disconnect" may be sent (such as a rejection or block of a connection invite). Any known standard or custom protocol may be employed such as SIP, SIMPLE, XMPP, extensions of various protocols, customized or unique protocols, etc.

The handling of ordinary connections, not available connections, IPTR connections and presence updates are illustrated in steps 3489 through 3501. For a first SPLS member "1" 3489 3490 3491, which in some examples is an Identity currently present and using a particular device, a SPLS member connection invitation is sent 3489, member 1's device answers 3490 (generally an automated acceptance because both are members of the same SPLS unless the Identity has intervened as described elsewhere), and the SPLS connection is opened 3491. For a second SPLS member "2" 3492 3493 3494, which in some examples is an Identity who is currently known to be not present based on the presence service, a SPLS member connection invitation is sent 3492 to the presence service 3492 which answers based on member 2's rule set in said presence service to either reserve a connection or leave a message (generally an automated reply based on the rule set in the presence service), and a future SPLS connection is reserved 3494 and will be scheduled for opening when member 2's presence is learned from a notification by the presence service 3493, at which time the reserved SPLS connection will be opened 3494. For a third SPLS member "N" 3495 3496 3497, which is any IPTR and in some examples is specifically a PTR (Place, Tool, Resource, etc.), a SPLS member connection invitation is sent 3495, member N answers 3496 (generally an automated acceptance because both are members of the same SPLS unless the PTR has a different availability as described elsewhere), and the SPLS connection is opened 3497. For any SPLS member "N2" its presence information may change 3498 3501 as described elsewhere, which in some examples is any Identity or Place that is employing a specific device, the presence service may receive new or updated status information from SPLS member N2 that causes a change in said SPLS member's presence information, in which example said updated presence information is communicated to one or a plurality of SPLS members 3498, and in some examples those SPLS members reopen their SPLS connection 3499 with SPLS member N2 based on the new presence information 3499 3500 3501 as described elsewhere (which status information in some examples is a different device, in some examples is a lack of availability on a current current in-use device requiring switching to a different in-use device, which in some examples is a different type of status change, etc.). In each of these examples the "invitation" 3489 3492 3495 and/or presence update re-connection invitation 3499 includes an indication of the connection information (such as a network identifier or network address for the inviting device) for making this connection, and the "answer" 3490 3493 3496 3500 includes an indication of the connection information (such as a network identifier or network address for the answering device), and these data are used in part to establish the SPLS connection. In each of these examples the "invitation" 3489 3492 3495 and/or presence update re-connection invitation 3499 includes an indication of the preferred and available media for connection on the inviting device (such as two-way video, text only, IM (instant messaging), audio only, etc., as described in more detail elsewhere), and the "answer" 3490 3493 3496 3500 includes an indication of the preferred and available media for connection on the answering device (as described elsewhere); and these media data are used in part to establish the SPLS connection. In each of these examples the "invitation" 3489 3492 3495 and/or presence update re-connection invitation 3499 includes an indication of other connection data needed from the inviting device, and the "answer" 3490 3493 3496 3500 includes an indication of other connection data needed from the answering device; and these other connection data are used in part to establish the SPLS connection.

TP connection service—focus a connection: Turning now to FIG. 77, "TP Connection Service—Focus a Connection (s)," some examples of focusing open SPLS connections and non-SPLS connections are illustrated. In some examples the device in use is an MTP (Mobile Teleportal) 3534 and FIG. 77 illustrates an MTP whose interface reflects some examples where said device interface's navigation is closed 3534 and it shows that one SPLS is open 3534. In some examples an open SPLS shows one or a plurality of the open SPLS members 3536 and the interface for this 3536 may include one or a plurality of live video streams (such as an Identity [person] or a Place), one or a plurality of icons (whose pictorial representations may or may not illustrate a specific activity such as walking or driving if a user is currently mobile and in transit between places), one or a plurality of a static photographic images (such as a photograph of an Identity [person] or a Place), one or a plurality of logos of a Tool or Resource, one or a plurality of images of an application's or service's interface, or other representations as described elsewhere. In some examples one, two or a plurality of SPLS's may be open 3534 3536 and the open SPLS members' representations 3536 may be displayed in various configurations and interface designs such as a grid (where the separate or combined SPLS members are displayed in rows, in columns, and or both rows and columns); interface widgets such as lists, pull-down widgets, menus, hypertext, links, etc.; one or a plurality of geographic maps; one or a plurality of carousels; one or a plurality of 3-D objects such as static cubes or rotating cubes, one or a plurality of graphic design such as 2-D triangles, 3-D pyramids, 2-D circles, 3-D spheres, etc.; or other interface design that provide ease-of-use or graphical beauty as preferred by each user and/or interface designer. In some examples of any interface design 3534 each SPLS member 3536 is in an idle state 3539 where the normal default is visible and muted, but the default may be set to any media, audio or state desired by the user of a device 3534 and also acceptable to each (remote) open SPLS member 3536. In some examples of any interface design 3534 each open SPLS member 3536 is findable, identifiable, and selectable by any known means such as in some examples a selection outline, in some examples a pointer, in some examples arrow buttons (up/down/left/right) such as in some examples on a keyboard or in some examples a wireless remote control, in some examples a mouse, in some examples a trackball, etc.; and any known means may be used to select and activate one or a plurality of SPLS members such as in some examples pressing a physical button, in some examples pressing a virtual button, in some examples clicking a pointer, in some examples pressing an enter key, in some examples utilizing other known selection and activation means.

As an example such as the MTP 3534 interface represented in this figure, one a user selects an open SPLS member 3536 it focuses and enlarges the SPLS connection such as in some examples choosing the second open SPLS member from the left 3536, and opening and displaying that as a focused two-way SPLS connection 3537 3535 3544. In some examples the user selects and activates one or a plurality of available SPLS members 3536 3539 3540; in some examples the user has been selected and activated by a different SPLS member 3540; in some examples the user has been found, identified, selected and activated by a person or Identity who is not a member of a currently open SPLS 3540; in some examples the user has been invited by a Tool or Resource who is not a member of a currently open SPLS 3540; and in any of these or other examples an invitation to focus a connection is sent 3540 and 3490 3496 in FIG. 76 and in some examples is accepted 3541 3545, in some examples is denied 3542, in some examples is put into waiting (pending and reserved) 3543 for a focused connection when available 3545, etc. In some examples an invitation is proposed 3541 and denied 3542 (which in some examples is an automated denial, in some examples is a manual denial, in some examples is a combination of automatic denial and manual response, etc.) and in some examples there is no response 3542 and the SPLS connection is put back into an idle (default) state 3539; but in some examples an automated message 3542 is sent as part of a denial; and in some examples a personal message 3542 is sent as part of a denial. In some examples an invitation is proposed 3541 but the recipient is currently busy 3543 or temporarily unavailable 3543 but will soon be available for a focused connection 3545; in some examples there is no response 3543 but the SPLS connection is put into a pending (waiting) state 3543 until the recipient is available and the focused connection may be displayed 3545 3537; but in some examples an automated message 3543 is sent as part of temporary waiting 3543; and in some examples a personal message 3543 is sent as part of waiting 3543; and in some examples a personal two-way focused connection 3545 is made to explain the need to wait 3543 and then suspended during waiting 3543. In some examples an invitation is accepted 3541 (which in some examples is an automated acceptance, in some examples is a manual acceptance, in some examples is a combination of automatic opening and manual response, etc.) and is then displayed as a two-way focused connection 3544 3545 3537; in this case the two-way focused connection 3545 may be used in any known way some of whose examples include: In some examples the audio may be muted 3546 and/or then un-muted 3546; in some examples the video connection may be ended 3547, made one-way only 3547 restarted 3547 etc.; in some examples one or a plurality of additional SPLS members may be added 3548 or removed 3548; in some examples SPLS PTR (Places, Tools, Resources, etc.) members may be added 3549; in some examples SPLS PTR members may be used 3549; in some examples SPLS PTR members may be ended 3549; in some examples non-SPLS IPTR members (which in some examples include Identities 3550, in some examples include Places 3550, in some examples include Tools 3550, in some examples include Resources 3550, etc.) may be found 3550 (such as in some examples from contact lists, in some examples from directories, in some examples from searches, in some examples from browsing, in some examples from links, in some examples from other known location means), may be invited or opened 3550, may be used 3550, may be shared 3550, may be ended 3550, etc.; in some examples there may be other types of uses or changes in a focused two way connection 3545. In some examples a two-way connection 3545 is ended 3552 and at such time if it is an SPLS member it is returned to its previous default state 3539 as described elsewhere. In some examples a two-way connection is with a non-SPLS member 3545 and if that is ended 3552 it is returned to its previous non-open state, but in some examples it may optionally be added to a personal contact list, personal directory, SPLS, or other means for retaining that IPTR's contact information and rapidly re-opening a connection with it.

Some media options in a focused connection: FIG. 78 illustrates some examples of media options in a focused SPLS connection by illustrating primarily video and audio communications; and some examples of starting, sharing, ending, etc. the inclusion of other IPTR, and in some examples other tools such as recordings or other tools and resources. While the two ends of this figure's media spectrum are full two-way multimedia communications and various types of silent observations, in some examples any types of real-time communications and messaging may be applied whether synchronous or asynchronous such as in some examples video, in some examples audio, in some examples text, in some examples IM, in some examples chat, and in some examples any known communications media. While the default in these examples is full communications 3562 with two way video and two-way audio, the initial connected state's default may be set to any media or combination of media—which in some examples depends on the settings from each participant, in some examples depends on the capabilities of each device, and in some examples may depend on other factors or preferences.

Turning now to FIG. 78, "Some Media Options in a Focused Connection," some examples are illustrated of ways to display a focused connection 3560. In some examples 2-way multimedia connections 3561 resemble videoconferencing 3561, multimedia collaboration 3561, etc. which are described in greater detail elsewhere. In some examples 2-way audio communications 3565 resemble telephone calls 3565, mobile phone calls 3565, etc. which are described in greater detail elsewhere. In some examples observation communications 3567 resemble the various types of audio and video observation 3567, video observation 3567 and audio observation 3567 which are described in greater detail elsewhere. FIG. 78 also shows the relationships between the various states and how each state may be automatically and/or manually switched to another state at any time by any connected party or device. In some examples the main focused connection states include full 2-way video and 2-way audio communication 3562, 2-way audio with incoming video only 3564, 2-way video with incoming audio only 3563, 2-way audio only with no video 3566, observation with both incoming video and incoming audio 3568, observation with incoming video only and no audio 3569, and observation with incoming audio only and no video 3597. In some examples the default for displaying a focused connection 3560 is full 2-way video and 2-way audio communications 3562, but in some examples each participant may set their own default to any of the main or customized media options available 3562 3563 3564 3566 3568 3569 3597 for a focused connection in their current device(s) in use. In some examples a focused connection in any of these states 3562 3563 3564 3566 3568 3569 3597 may include adding one or a plurality of IPTR 3598; in some examples these may include sharing one or a plurality of already connected IPTR 3598; in some examples these may include adding and then sharing one or a plurality of IPTR 3598; in some examples these may include ending one or a plurality of connected IPTR 3598; in some examples these may include recording a focused connection 3598; in some examples these may include any other operation that may be performed on a connected state 3598 3562 3563 3564 3566 3568 3569 3597.

In some examples the relationships between the various focused communication states include how each state may be switched automatically and/or manually to another state by any connected party and/or device. In some examples full 2-way video and 2-way audio communication 3562 may have outgoing video ended resulting in the focused communication state of 2-way audio with incoming video only 3564. Conversely, in some examples the focused communication state of 2-way audio with incoming video only 3564 may have outgoing video started resulting in the focused communication state of full 2-way video and 2-way audio communication 3562. In some examples full 2-way video and 2-way audio communication 3562 may have outgoing audio muted resulting in the focused communication state of 2-way video with incoming audio only 3563. Conversely, in some examples the focused communication state of 2-way video with incoming audio only 3563 may have outgoing audio unmuted or started resulting in the focused communication state of full 2-way video and 2-way audio communication 3562. In some examples 2-way audio with incoming video only 3564 may have incoming video ended resulting in the focused communication state of 2-way audio only with no video 3566. Conversely, in some examples the focused communication state of 2-way audio only with no video 3566 may have incoming videos started resulting in the focused communication state of 2-way audio with incoming video only 3564. In some examples the focused communication state of 2-way video with incoming audio only 3563 may have outgoing video ended resulting in the focused observation state of both incoming video and incoming audio 3568. Conversely, in some examples the focused observation state of both incoming video and incoming audio 3568 may have outgoing video started resulting in the focused communication state of 2-way video with incoming audio only 3563. In some examples the focused communication state of 2-way video with incoming audio only 3563 may have outgoing audio ended and outgoing video ended resulting in the focused observation state of only incoming audio and no incoming video 3569. Conversely, in some examples the focused observation state of only incoming video and no incoming audio 3569 may have outgoing audio started and outgoing video started resulting in the focused observation state of 2-way video with incoming audio only 3563. In some examples 2-way audio only with no video 3566 may have outgoing audio ended resulting in the focused observation state of only incoming audio and no incoming video 3597. Conversely, in some examples the focused observation state of only incoming audio and no incoming video 3597 may have outgoing audio started resulting in the focused communication state of 2-way audio only with no video 3566. In some examples 2-way audio with no video 3566 may have incoming video started and outgoing audio ended resulting in the focused observation state of both incoming video and incoming audio 3568. Conversely, in some examples the focused observation state of both incoming video and incoming audio 3568 may have incoming video ended and outgoing audio started resulting in the focused communication state of 2-way audio with no video 3566. In some examples the focused observation state of both incoming video and incoming audio 3568 may have outgoing video ended resulting in the focused observation state of only incoming audio and no incoming video 3597. Conversely, in some examples the focused observation state of only incoming audio and no incoming video 3597 may have outgoing video started resulting in the focused observation state of both incoming video and incoming audio 3568. In some examples the focused observation state of both incoming video and incoming audio 3568 may have outgoing audio ended resulting in the focused observation state of only incoming video and no incoming audio 3569. Conversely, in some examples the focused observation state of only incoming video and no incoming audio 3569 may have outgoing audio started resulting in the focused observation state of both incoming video and incoming audio 3568. In some examples other automated and/or manual switches are possible such as between any two states by starting or ending video, and/or starting or ending audio; or such as by adding or ending any IPTR 3598; or such as by sharing or using collaboratively any IPTR 3598; or such as by one or more parties recording any focused connection 3560 3562 3563 3564 3566 3568 3569 3597; etc.

In some examples any party to any focused connection 3560 3562 3563 3564 3566 3568 3569 3597 may have one or a plurality of simultaneous focused connections 3560 3562 3563 3564 3566 3568 3569 3597 and/or one or a plurality of queued focused connections awaiting attention 3560 3562 3563 3564 3566 3568 3569 3597 with each focused connection and queued connection identified in one or more ways that differentiates it from other focused connections and other queued connections; and said party may use, display and/or navigate the focused connections 3560 3562 3563 3564 3566 3568 3569 3597 in any non-linear manner desired. In some examples any of these one or a plurality of simultaneous focused connections 3560 3562 3563 3564 3566 3568 3569 3597 and simultaneous queued connections 3560 3562 3563 3564 3566 3568 3569 3597 may have richer information associated with it in some examples indicating its immediate availability, in some examples indicating the bandwidth and video quality available for the connection, in some examples indicating the length of time since it was last accessed (e.g., how long the other parties in that connection have been waiting or on hold), in some examples indicating the types of connections available based upon the other party(ies)'s devices in use, in other examples indicating other types of richer information associated with each simultaneous focused connection or simultaneous queued connection 3560 3562 3563 3564 3566 3568 3569 3597.

In some examples any other media may be used and turned on or turned off in a manner that parallels what is described 3561 3565 3567 3598; such as in some examples the use of text chatting as in IM (Instant Messaging) applications; such as in some examples the use of SMS texting as in personal texting and/or Twitter (microblogging); such as in some examples the use of surveillance camera video; such as in some examples any other type of media, messaging and/or communication.

Dynamic presence awareness to make focused connections: FIG. 79, "Dynamic Presence Awareness to Make Focused Connections," provides some examples of the combination of digital presence (such as in FIGS. 70 through 72 and elsewhere), presence architecture (such as in FIG. 73 and elsewhere), and the TP connection service (such as in FIGS. 74 through 77). In some examples the presence service(s) receives new state information 3570, compares that to the appropriate rules in the presence service 3571, and determines the appropriate presence information to display to each SPLS member 3571, all of which is described in more detail elsewhere. In some examples that presence information is then displayed to each SPLS member 3592 as described elsewhere. In some examples each SPLS member may then use the TP connection service 3593 to make a focused connection with one or a plurality of SPLS members 3593. In some examples each SPLS member may then use the TP connection service 3593 to make a focused connection with one or a plurality of non-members of the open SPLS(s) 3593 by means of contact lists, address books, directories, etc. as described elsewhere. In some examples these focused connections 3593 may be in any of the media options available for the present identity(ies)'s current device in use (as described elsewhere such as in FIG. 78).

In some examples the presence information 3571 that is displayed 3592 is derived dynamically 3570 3571 from a user's normal activities with a variety of devices, tasks, etc. throughout the day as described here and elsewhere. A user's state information changes 3573 3574 as the user performs various tasks throughout a day, communicates by means of various communication systems and devices, and interacts with various devices and systems in the performance of those tasks and those communications. In some examples various state changes 3573 are tracked 3574 and transmitted to a presence service(s) 3583 3570. In some examples a tracked state change 3573 3574 is a change in identity(ies) 3575. In some examples a tracked state change 3573 3574 is a change in which SPLS(s) are currently open 3576. In some examples a tracked state change 3573 3574 is a change in the device(s) currently in use 3577. In some examples a tracked state change 3573 3574 is a change in the use of the device(s) 3578 such as when it is being used to make a focused connection and that user is therefore "busy" and (depending upon the rules for that use) may or may not be available. In some examples a tracked state change 3573 3574 is a change in the task(s) being performed 3578 such as when a task should not be interrupted (depending upon the rules for that use) so that user is not available during the performance of that task. In some examples a tracked state change 3573 3574 is a change in location(s) 3579 such as when a user is traveling between locations and may therefore be more available for certain types of connections (such as 2-way audio only while driving a vehicle), or depending on location may be prefer certain types of media (such as full 2-way video and 2-way audio with additional IPTR when in a conference room at work). In some examples a tracked state change 3573 3574 is a change that a user makes by directly entering their presence availability 3580 or lack of availability 3580. In some examples a tracked state change 3573 3574 is a change in the rules that determine presence 3581 (such as when engaged in a focused business connection at work, do not interrupt with a focused personal connection). In some examples a tracked state change 3573 3574 is any other tracked state change(s) 3582. In any one or a plurality of tracked state changes 3574 3575 3576 3577 3578 3579 3580 3581 3582, transmit the state change(s) to a presence service(s) 3583; where in some examples that the state changes are received by the presence service 3570, compared to rules 3571, and new presence information is determined 3571.

In some examples the presence information 3571 that is displayed 3592 is derived from a user's local or remote changes that affect the presence service(s) 3584 3585 such as administrative changes 3584, profile changes 3584, etc. that in turn are saved 3570 and used to determine presence information 3571. In some examples various administrative changes 3584 3585, profile changes 3584 3585, local changes 3584 3585, etc. are made and transmitted to a presence service(s) 3595 3570. In some examples a tracked administrative, profile, or local change 3584 3585 is a change in identity(ies) 3586 such as adding an identity, removing an identity, etc. In some examples a tracked administrative, profile, or local change 3584 3585 is a change in one or a plurality of SPLS(s) 3587 such as adding an SPLS, removing an SPLS, editing an SPLS's members, etc. In some examples a tracked administrative, profile, or local change 3584 3585 is a change in one or a plurality of devices 3588 such as adding a device, removing a device, editing a device's profile information, changing a device's communications service, etc. In some examples a tracked administrative, profile, or local change 3584 3585 is a change in one or a plurality of presence rules 3589 such as changing the rule(s) 41's availability while traveling to and from work.

In some examples a tracked administrative, profile, or local change 3584 3585 is a change in one or a plurality of visibility settings 3590 such as whether a user is visible or invisible to an SPLS(s), to a group within an SPLS, to one or a plurality of SPLS members, or non-members of an SPLS. In some examples a tracked administrative, profile, or local change 3584 3585 is a change in one or a plurality of visibility settings 3590 such as whether a user is partially visible with some attributes displayed and some attributes not displayed to an SPLS(s), to a group within an SPLS, to one or a plurality of SPLS members, or non-members of an SPLS; where in some examples said attributes may include location; in some examples said attributes may include current activities; in some examples said attributes may include device(s) currently in use; in some examples said attributes may include group messages sent to all or part of the SPLS; in some examples other attributes may be selectively displayed or not displayed. In some examples a tracked administrative, profile, or local change 3584 3585 is a change in one or a plurality of visibility settings 3590 such as setting a dynamic relationship between two or a plurality of attributes so that the display of some attributes may dynamically be based on another attribute such as location, whereby in some examples local SPLS members may receive current and precise location information while remote SPLS members may not receive location information—so those whose location is that they are physically present in the same place (such as a workplace or event such as a conference or concert. or public place such as a park or a mall, or a neighborhood such as a shopping street or a downtown area) are provided the user's location while those not physically present are excluded and do not receive the user's location information. In some examples a tracked administrative, profile, or local change 3584 3585 is a change in one or a plurality of private status settings 3590 such as whether an entire identity, a user attribute, a SPLS attribute or other component is marked private and governed by privacy policies, privacy rules or other privacy means, as described elsewhere. In some examples a tracked administrative, profile, or local change 3584 3585 is a change in one or a plurality of secret status settings 3590 such as whether an entire identity, a user attribute, a SPLS attribute or other component is marked secret and governed by secrecy policies, secrecy rules or other secrecy means, as described elsewhere.

In some examples a tracked administrative, profile, or local change 3584 3585 is a change in one or a plurality of visibility settings 3590 such as whether one or a plurality of others are visible or invisible to a user, whether the others are an SPLS(s), a group within an SPLS, one or a plurality of SPLS members, or non-members of an SPLS. In some examples a tracked administrative, profile, or local change 3584 3585 is a change in one or a plurality of visibility settings 3590 such as whether one or a plurality of others are partially visible with some attributes displayed and some attributes not displayed to a user, whether the others are an SPLS(s), a group within an SPLS, one or a plurality of SPLS members, or non-members of an SPLS; where in some examples said attributes of others may include their location(s); in some examples said attributes of others may include their current activities; in some examples said attributes of others may include their device(s) currently in use; in some examples said attributes of others may include group messages they have sent to all or part of the SPLS; in some examples other attributes of others may be selectively displayed or not displayed. In some examples a tracked administrative, profile, or local change 3584 3585 is a change in one or a plurality of others' visibility to a user 3590 such as setting a dynamic relationship between two or a plurality of attributes so that the display of some attributes may dynamically be based on another attribute such as location, whereby in some examples local SPLS members may receive current and precise location information from others while the location of physically remote SPLS members may not be displayed—so those whose location is that they are physically present in the same place (such as a workplace or event such as a conference or concert. or public place such as a park or a mall, or a neighborhood such as a shopping street or a downtown area) are provided when a user is co-located with other SPLS members, while those not physically present are excluded and their remote location information is not displayed to the user. In some examples a tracked administrative, profile, or local change 3584 3585 is a change in one or a plurality of others' private status settings 3590 such as whether others' identity(ies), one or a plurality of their user attributes, one or a plurality of their SPLS attributes, or other visible attributes are marked private and therefore governed by privacy policies, privacy rules or other privacy means, as described elsewhere. In some examples a tracked administrative, profile, or local change 3584 3585 is a change in one or a plurality of others' secret status settings 3590 such as whether others' identity(ies), one or a plurality of their user attributes, one or a plurality of their SPLS attributes, or other visible attributes are marked secret and therefore governed by secrecy policies, secrecy rules or other secrecy means, as described elsewhere In some examples a tracked administrative, profile, or local change 3584 3585 is a change in one or a plurality of visibility settings 3590 such as whether a user is partially visible with some attributes displayed and some attributes not displayed to an SPLS(s), to a group within an SPLS, or to one or a plurality of SPLS members; where in some examples said attributes may include location; in some examples said attributes may include current activities; in some examples said attributes may include device(s) currently in use; in some examples said attributes may include group messages sent to all or part of the SPLS; in some examples other attributes may be selectively displayed or not displayed. In some examples a tracked administrative, profile, or local change 3584 3585 is a change in one or a plurality of visibility settings 3590 such as setting a dynamic relationship between two or a plurality of attributes so that the display of some attributes may dynamically be based on another attribute such as location, whereby in some examples local SPLS members may receive current and precise location information while remote SPLS members may not receive location information—so those whose location is that they are physically present in the same place (such as a workplace or event such as a conference or concert. or public place such as a park or a mall, or a neighborhood such as a shopping street or a downtown area) are provided the user's location while those not physically present are excluded and do not receive the user's location information. In some examples a tracked administrative, profile, or local change 3584 3585 is a change in one or a plurality of private status settings 3590 such as whether an entire identity, a user attribute, a SPLS attribute or other component is marked private and governed by privacy policies, privacy rules or other privacy means, as described elsewhere. In some examples a tracked administrative, profile, or local change 3584 3585 is a change in one or a plurality of secret status settings 3590 such as whether an entire identity, a user attribute, a SPLS attribute or other component is marked secret and governed by secrecy policies, secrecy rules or other secrecy means, as described elsewhere.

In some examples a tracked administrative, profile, or local change 3584 3585 is any other administrative presence change 3591, profile change that affects presence 3591, or other change that affects presence 3591. In any one or a plurality of administrative, profile, or local changes 3585 3586 3587 3588 3589 3591, transmit the change(s) to a presence service(s) 3595; where in some examples those changes are received by the presence service 3570, used to update its administration, rules, profiles, SPLS's, etc. 3570, and the updated presence service 3571 then determines current presence 3571 as described elsewhere.

In some examples one or a plurality of tracked states 3574 3575 3576 3577 3578 3579 3580 3581 3582 are provided by self-monitoring by a device. In some examples one or a plurality of tracked states are provided by external monitoring by a service or a system. In some examples one or a plurality of tracked states are provided by external monitoring by a server, an application, a Web service, or any other type of application or service. In some examples one or a plurality of tracked states are provided by external monitoring by a router, a proxy server, a switch, or any other type of communications device or service. In some examples one or a plurality of tracked states are provided by external monitoring by GPS, by wireless triangulation, or any other type of location tracking and/or determination. In some examples one or a plurality of tracked states are provided by a connected external source or resource such as an AKM (Active Knowledge Machine), governance, or any other connected service. In some examples one or a plurality of tracked states are provided by other state change tracking means.

Regardless of the state information tracking means, in some examples state information and data 3574 3575 3576 3577 3578 3579 3580 3581 3582 are transmitted to the presence service(s) 3583 3570. In some examples state changes 3574 3575 3576 3577 3578 3579 3580 3581 3582 are transmitted to the presence service(s) 3583 3570. In some examples the state information, data and/or changes 3583 3570 are processed by the rule(s) 3571 and the resulting presence information 3571 is compared to the current presence information 3592. In some examples if there is no change in presence information 3571, then there is no change in the presence information displayed 3571 3572. In some examples, however, there is a change in presence information 3571, then the presence information displayed 3571 3572 is changed to reflect the new presence information 3571. In some examples the changed presence information 3571 is transmitted first to one or a plurality of presence servers which then display the changed presence information 3571 3572. In some examples the changed presence information 3571 is transmitted directly to one or a plurality of SPLS members 3571 3572 where it is appropriately displayed or not displayed according to the state and configuration of each device 3572.

In some examples there is not a change of state 3573 or of state information 3573; there has not been an administrative change 3584; there has not been a user change 3584, there has not been a profile change 3584; there has not been a local change 3584; and there have not been other changes; in which cases nothing is transmitted to a presence service(s) 3594.

Individual control of presence boundaries: Various IPTR (Identities [people], Places, Tools, Resources, etc.) would like different levels of control over the access to and display of their presence information by other IPTR (Identities [other people], Places, Tools, Resources, etc.). In some examples many people have one or a plurality of different communication devices and would like their current presence and availability known by one or a plurality of IPTR. In some examples some people do not want to provide access to themselves or their presence information to one or a plurality of unrelated IPTR to prevent unwanted contacts, to provide greater security, to protect their privacy, etc. In some examples some people would like to provide limited access and display of their presence information by IPTR, with only certain selected contact information and/or presence details released.

FIG. 80, "Individual Control(s) of Presence Boundary (ies)," shows some examples where different types of access and/or different presence information may be provided based on the choices of each IPTR that controls its presence information, rule(s), policy(ies), access type(s), boundary(ies), etc. By these means each controlling IPTR may determine either the access to its presence information, or the display of its presence information, or both access to and display of presence information—so that these means constitute a Presence Boundary(ies) for each IPTR. This differs from numerous current presence systems that either grant or deny access and/or viewing of one's presence so that either all or no presence is known. This also differs from numerous current presence systems that require explicit entry of one's presence (such as "I am available" or "Not available—in a meeting") which remain static until one explicitly changes it to a different presence; a manual process that is so easily forgotten that it is often inaccurate.

Turning now to FIG. 80, the center column represents individuals and IPTR who control their presence information boundary(ies) 3605; the left column represents SPLS members 3600 and other authorized IPTR who may receive presence information 3600; and the right column represents others who are currently not authorized but may want to contact an individual 3605, or contact an IPTR 3605, or merely see an IPTR's presence information 3605. In some examples this begins with an individual 3606 or an IPTR 3606 (herein called SPLS Member 1) who may add, copy, edit or delete their presence information rule(s), policy(ies), access type(s), boundary(ies), etc. (herein called a rule[s]). In some examples this 3606 may be done simply by copying this in whole or in part from any other SPLS member, list, boundaries database, rules database, or other presence boundary resource. In some examples SPLS Member 1 applies the rule(s) 3606 to one or a plurality of entire SPLS(s) 3607 3600 or other authorized IPTR 3607 3600. In some examples SPLS Member 1 applies the rule(s) 3606 to one or a plurality of SPLS groups 3607 (said SPLS groups are described elsewhere) 3600 or other authorized IPTR 3607 3600. In some examples SPLS Member 1 applies the rule(s) 3606 to one or a plurality of individual SPLS members 3607 (who may be any IPTR that is part of an SPLS) 600 or other authorized IPTR 3607 3600. In some examples SPLS Member 1 applies the rule(s) 3606 to one or a plurality of non-members of an SPLS 3607 3611 (such as Non-member 3) or other non-authorized IPTR 3607 3611. In some examples SPLS Member 1 determines a default rule(s) 3606 that is applied if an initiating party 3600 3611 is unknown.

In some examples the presence service 3608 retrieves or receives SPLS Member 1's state information 3608, evaluates it to determine this SPLS member's presence information 3608, and determines this SPLS member's presence information according to rules management logic 3606 3607 3608 (as described elsewhere). In some examples the initiating party 3600 3601 3611 3612 is a main attribute of the rule(s) logic 3607 3608 that determines both access to presence information 3609, and the presence information that is displayed 3609 for that initiating party 3604 3614. As a result in some examples access to presence information 3608 3609 may be blocked 3604 3614; in some examples access to presence information 3608 3609 may be allowed 3604 3614; in some examples different presence information 3608 3609 may be displayed for different individual SPLS members 3604; in some examples different presence information 3608 3609 may be displayed for different SPLS's 3604; in some examples different presence information 3608 3609 may be displayed for different SPLS groups 3604; in some examples different presence information 3608 3609 may be displayed for different authorized IPTR 3604; in some examples different presence information 3608 3609 may be displayed for one or a plurality of types of non-members 3614 such as Non-member 3. In some examples the presence service 3609 "pushes" the appropriate and (optionally) different presence information 3610 to each authorized recipient 3600 3604 or not authorized recipient 3611 3614. In some examples authorized recipients 3600 3604 and/or not authorized recipients 3611 3614 "retrieve" their appropriate and (optionally) different updated presence information 3610 from the presence service 3608 3609.

In some examples an SPLS Member 2 3600 3601 opens an SPLS 3601 and is authorized to receive presence information 3601; in some examples an authorized IPTR 3600 3601 opens an SPLS 3601 and may receive presence information 3601 (herein together called SPLS Member 2). In some examples an SPLS Member 2 3601 opens an SPLS 3601 and is authorized to receive the same presence information 3607 as others in that SPLS 3603. In some examples an SPLS Member 2 3601 opens an SPLS 3601 and is authorized to receive the same presence information 3607 as others in a particular SPLS group 3603. In some examples an SPLS Member 2 3601 opens an SPLS 3601 and is authorized to receive unique and individual presence information 3607 3603. As a result in each example SPLS Member 2 3603 sees Member 1's presence information 3604 according to a rule(s) 3608 3609.

In some examples a non-member 3611 3612 such as Non-member 3 3612 may need SPLS Member 1's 3605 contact information and/or presence information 3609; in some examples a non-authorized IPTR 3611 3612 needs SPLS Member 1's 3605 contact information and/or presence information 3609 (herein together called non-member initiating party). In some examples non-member initiating party 3612 queries a directory(ies) 3612, in some examples it queries another resource for obtaining contact information 3612, in some examples it queries a presence service 3612, etc.; by means of queries in some examples such as SPLS Member 1's name 3612, in some examples by SPLS Member 1's unique identifier 3612, in some examples by SPLS Member 1's known details 3612 such as an address or phone number, in some examples by SPLS Member 1's group membership(s) 3612 such as a company name, in some examples by a lookup in a tool such as a search service 3612, in some examples by a resource that can provide or acquire lists of potential contacts 3612, etc.

In some examples a non-member initiating party 3612 inquires about SPLS Member 1's contact information and/or presence information 3612 3609 and SPLS Member 1 has created one or a plurality of access types 3607 for non-members of an SPLS 3607 3611 or other non-authorized IPTR 3607 3611. In some examples a non-member initiating party 3612 has an access type 3607 3613 that blocks access to contact information and/or presence information 3609. In some examples a non-member initiating party 3612 has an access type 3607 3613 that permits access 3607 to contact information and/or presence information 3609; in some examples an access type 3607 3612 is permitted to view contact information and/or presence information 3609 3614; in some examples an access type 3607 3612 is permitted to send a message(s) (such as e-mail, voice mail, video mail, etc.) to SPLS Member 1 3609 3614; in some examples an access type 3607 3612 is permitted to open a focused connection with SPLS Member 1 3609 3614; in some examples an access type 3607 3612 has other permitted actions and options with SPLS Member 1 3609 3614. As a result in each example a nonmember initiating party 3612 may be permitted to see Member 1's contact information and/or presence information 3614 according to a rule(s) 3608 3609; and/or may also be permitted to act upon said contact information and/or presence information 3614 according to its access type 3607 3613 and a rule(s) 3608 3609.

In some examples SPLS Member 1's presence changes 3610 and the presence service 3608 retrieves or receives Member 1's new state information 3610; in some examples Member 1's changed state information 3610; in some examples Member 1's directly entered new presence information 3610; etc. (herein collectively called new state information 3610). In some examples the presence service evaluates the new state information 3610 3608 and determines that SPLS Member 1's presence has not changed and does not need to be updated. In some examples the presence service evaluates the new state information 3610 3608 and determines that SPLS Member 1's presence information has changed 3608 and needs to be updated 3609 3604 3614. In some examples the new presence information 3608 3609 is determined for each SPLS member 3600 3601; in some examples the new presence information 3608 3609 is determined for each authorized IPTR 3600 3601; in some examples the new presence information 3608 3609 is determined for each non-member access type 3611 3612 such as for Non-member 3 3612; in some examples the new presence information 3608 3609 is determined for each not authorized IPTR access type 3611 3612. As a result in each example the updated presence information 3610 is determined 3608 and provided 3609 as appropriate for each authorized recipient 3600 3604 3611 3614. In some examples the presence service 3609 "pushes" the appropriate updated presence information 3610 to each authorized recipient 3600 3604 3611 3614. In some examples authorized recipients 3600 3604 3611 3614 "retrieve" the appropriate updated presence information 3610 from the presence service 3608 3609.

In some examples the rules management logic 3608 defines how to determine the presence information 3608 from the state information 3608. In some examples the rules include rules 3606; in some examples the rules include policies 3606; in some examples the rules include access types 3606; in some examples the rules include boundaries 3606 (herein a rule(s), policy(ies), access type(s), boundary(ies), etc. are called a rule[s]). In some examples for each type of presence information determined 3606 3608 3609 or category of presence information 3606 3608 3609 a user 3605 may establish rules that determine how they should have a connection focused, a message received, a connection invited, etc. based on their current devices in use. In some examples one or more sets of rules may simply be copied from others 3606. In some examples a device(s) may change such as when leaving work a user might switch from a corporate mobile phone or corporate mobile TP device to a personal mobile phone or personal mobile TP device; in some examples an identity(ies) may change such as when leaving work a user might switch his or her logged in identity from a work identity to a personal identity; in some examples an open SPLS(s) may change such as when leaving work a user might switch from a company's SPLS to a family and friends SPLS; in some examples a location(s) may change such as when leaving work a user might travel from a corporate office to his or her home; in some examples a task(s) may change such as when leaving a meeting at work to go out to a social lunch with a spouse; in some examples other factors may change in either individually or in combination such as when using a laptop while also answering a phone call or a focused TP connection. In each of these examples and others the presence service may provide fine-grained and accurate information as to a user's current availability; however, in some examples the presence service may default to employ the current state information to estimate a user's availability and let the recipient of the presence information decide whether or not to open a focused connection with the user.

In some examples the rules management logic 3608 defines how to determine the privacy of presence information 3608 such that the displayed information 3604 3614 may not display information that a user, such as SPLS Member 1, would like to keep confidential. In some examples the rules management logic 3608 provides this privacy 3608 by selectively removing 3608 part of the presence information 3609 before it is communicated to a recipient party 3604 3614; as one example of a privacy rule 3606 the presence information 3609 of SPLS Member 1 3605 3609 for a non-member 3611 3614 such as Non-member 3 3614 may include that this user's current TP Device is available for a focused connection, but not disclose the current physical location of this user, nor disclose the current use or state of this user's other devices or tasks or identities; and simultaneously, as another example of a privacy rule 3606 the presence information 3609 of SPLS Member 1 3605 3609 for SPLS Member 2 3600 3604 may include full disclosure of all of SPLS Member 1's current presence information.

COMBINING TP DIGITAL PRESENCE (TPDP) AND A PLACE, CONTENT AND/OR ADVERTISING: Some examples of types of places: For various reasons one of the more interesting types of TPDP is to include a place and content that is combined with the presence of two or a plurality of identities. In some examples a meeting place can be on any continent worldwide such as in New York, Geneva (Switzerland), Cape Town (South Africa), Mumbai (India), Beijing (China), a rural village or farm in a developing country, or on an ocean liner off the coast of Antarctica. In some examples any of these places can be a typical work environment like a conference room, an executive office or an office cubicle. In some examples any of these worldwide places can be where employees are working such as on a manufacturing assembly line (such as where a line shutdown occurs or where a new improvement may be possible), inside a distribution warehouse (such as how a truck is being loaded or the way a particular item is stored), on a retail store's sales floor (such as to help a customer make a selection, or added to self-serve cash registers to help customers make purchases), or at a field site like a deep-ocean oil drilling platform (such as to help in the control room or select the correct drill bit). In some examples any of these worldwide places can be educational (such as in multiple classrooms so students from different countries can work together on projects), a nonprofit charity (such as medical professionals who help contain a contagious disease outbreaks as soon as they occur), a government (such as confirming aircraft inspection procedures at an airline's multiple airports), or for human development (such as a UN team that helps improve drinking water sanitation at local villages). In some examples any of these worldwide places can be pleasurable such as on a Tahiti beach, an observation deck on the Eiffel Tower on a summer evening, or dinner with someone while he or she is on a business trip. In some examples any of these places can be adventurous such as on a mountain peak, under the sea on a coral reef, or off of the earth such as from the surface of Mars (via NASA's Spirit or Opportunity rovers) or orbiting Saturn (via the Cassini-Huygens spacecraft). In some examples audiences and gatherings may take place in combination with a place with or without content (such as presentations, a music concert, an event such as a sports event like a wrestling match or a football game, etc.), advertising (that may be customized for each participant or audience member), audio (such as from one speaker, or from a select group that is present together at a gathering), point of view (such as from the viewpoint of a participant, such as from the viewpoint of a different audience member, such as from the viewpoint of a player in a sports event such as the viewpoint of a quarterback on a football team, such as from an elevated view over an event or gathering, etc.).

Some examples of obtained video of places: In some examples a place may be displayed as high definition live video with or without local audio from the place; in some examples a place may be displayed as streaming video with or without local audio from the place; in some examples a place may be displayed as a static image with or without local audio; in some examples a place may be displayed as a series of occasionally changing real-time images provided via low bandwidth with or without local audio; in some examples a place may be displayed as an interactive virtual place with or without simulated audio; in some examples a place may be displayed as a design or illustration of a real or virtual place with or without simulated audio; in some examples a place may be displayed as an animation with or without simulated audio; in some examples a place may be displayed with realistic 3-D audio or stereo audio background sounds; in some examples a place may be displayed with monaural audio; in some examples a place may not include local audio from the place; in some examples the display of a place may include one or more participants in a focused connection who are physically present in the place; in some examples a place may be displayed by means of any technology(ies), capability (ies), feature(s) that are known whether the depicted reality is real or virtual or a blend of both.

Some summaries of the process: In some examples presence in a place is achieved by real-time video background replacement of the identity(ies) (person[s]) that are digitally present in a focused connection including: obtaining live or recorded video (with or without audio) from a real and/or virtual place, transmitting the video if from a live place, receiving the video if from a live place, separating the image (s) of the one or plurality of person(s) who are present from their background(s), combining and/or compositing one or a plurality of those present person(s) as foreground with the video and (optionally) audio of the place as background, rendering the video as a combination of appropriately selected person(s) and place or (optionally) rendering the video to fit the view of each separate participant(s), and displaying a blended video of the appropriate person(s) in the place for each participant. In addition, in some examples presence in a place also includes obtaining additional content (such as content, application(s), advertising, marketing, messages, images, etc.) and blending those into the background representation of the place such that the place may be partially live, and/or partially recorded, and/or partially digitally enhanced, and/or partially combined with various types of messages and/or communications, and/or partially designed or constructed in any known manner. In addition, in some examples the digitally separated and/or constructed place may be substituted at one or a plurality of sources as if they were real so that an altered reality may be presented as if it were the real reality with or without communicating said source(s) substitution to those who are "present" in the substituted "place."

Some examples of locations where this may be performed in the architecture: The combination of presence and place may occur in one or a plurality of areas in the architecture—during sending, during receiving, on the network, or in a combination of these, including either or both local and/or remote locations. In some examples the separation of a person (s) from their background(s) and replacing one or a plurality of parts of the background with an obtained place (with or without additional content blended in) may be done by a sender(s) prior to transmitting a presence. In some examples the separation of a person(s) from their background(s) and replacing one or a plurality of parts of the background with an obtained place (with or without additional content blended in) may be done by a recipient after receiving the presence data from one or a plurality of others who are present. In some examples the separation of a person(s) from their background (s) and replacing one or a plurality of parts of the background with an obtained place (with or without additional content blended in) may be done during transmission over a network such as in some examples by an application server that receives the transmission from one or a plurality of those present, performs the replacement(s) and then retransmits the new blended digital presence to one or a plurality of others who are present in the focused connection. In some examples a device may be in use that does not have the hardware and/or software capability to combine presence and place so this may be performed for that device by a different local or remote device. In some examples the separation of a person(s) from their background(s) and replacing one or a plurality of parts of the background with an obtained place (with or without additional content blended in) may be done in two or more times and places during sending, transmitting and receiving one focused connection so that different participants are present in different places, or are present in one place but see different content (such as different advertisements) in that place, etc. Whether the separation of person(s) from their background and the replacement and blending to create presence in a digital place takes place at the sender, at the recipient, on the network, and/or in other places or methods, in some examples a new combination of presence in a digital place may be presented as if this is reality (that is, without indicating or communicating that any substitution(s) have been performed).

Some of the apparatus(es) that do this: In some examples this includes a system for real-time video background replacement including: in some examples a device that obtains live video and audio and transmits it over a network, in some examples a system that uses a device to obtain live video and audio and transmit it over a network, in some examples a server and database that provides archived recording(s) of a place(s) and transmits it locally and/or over a network, in some examples a server and database that provides a virtual place(s) and transmits it locally and/or over a network, in some examples a server and database that provides content (such as advertising, marketing, messages, images, etc.) and transmits it locally and/or over a network, in some examples a separation component that segments a person(s) from a background in a video and transmits it locally and/or over a network, in some examples a replacement component that replaces the background with a different background and transmits it locally and/or over a network, in some examples a replacement component that replaces part of a background with a different background such as content (such as advertising, marketing, messages, images, etc.) and transmits it locally and/or over a network, in some examples a replacement component that replaces part of a background with a different background such as another person that is present and transmits it locally and/or over a network, in some examples a replacement component that replaces part of a foreground with a different foreground such as a person that is present and transmits it locally and/or over a network, in some examples a rendering component to render the composite foreground and background(s) as a single video and transmits it locally and/or over a network, in some examples a receiving device to receive video and display the video, in some examples a receiving device to receive video and display the video with a replacement component to modify the video before it is displayed and transmit the modified video locally and/or over a network, in some examples a display device to display the composited and/or received video.

Some of the technologies that perform this: Various existing technologies may be employed to provide one or a plurality of steps for real-time separation (such as background/foreground modeling, object segmentation, background selection and filtering, foreground selection and filtering, etc.) or replacement and blending (such as one or a plurality of background replacements, compositing, blending, rendering, displaying, locking to prevent subsequent separation], etc.) or transmission (such as sending, receiving, network interception with processing and re-transmission, substitution at sources, etc.). In some examples these provide a real-time system that can identify, detect and track a moving object in video whether the camera is stationary or moving. In some examples the subject is separated from the original background for each frame processed. In some examples these segment backgrounds from foregrounds. In some examples these segment objects. In some examples the segmented foregrounds, backgrounds, objects, etc. are photorealistic images, and in some examples they are photorealistic live video that is dynamically segmented in real-time or in near real-time. In some examples these construct models and analyze those models to determine boundaries and separate segments. In some examples these analyze light levels and shadows. In some examples these analyze pixels. In some examples these analyze motion within a larger field. In some examples these utilize other techniques and methods. In some examples these replace the background so that a subject is placed in front of a different background in various applications such as video conferences, online chatting, teaching, videophone calls, etc. In some examples these provide registration between a first and second image(s). In some examples these include an image aligner that computes the alignment between a first and second image(s). In some examples these include image measurements so that different images may be sized appropriately relative to each other and relative to a background. In some examples these transmit the video of a speaker in front of a replaced background. In some examples each of the participants may choose a different real-time replacement of the background, with the new background being static or dynamic. In some examples background replacement includes the real-time substitution of a different dynamic background. In some examples background replacement includes the dynamic creation of an alternate background. In some examples the separated subject is blended with the new background for each frame. In some examples each participant can control their position within a background image environment. In some examples changing one's image's position in a video stream image alters one's viewpoint within the video stream image. In some examples changing one's image's position in a video stream image does not alter the viewpoint of how the video stream is displayed. In some examples each participant can control the position of one or a plurality of other participants in a background image environment. In some examples one background environment may be utilized by multiple different connections without any one connection including participants from any of the other connections, so that one background video image stream may support numerous connections that occur simultaneously and are independent of each other. In some examples the audio volume is proportionate to the distance between the placement of the participants in the connection, so that participants who are closer hear louder volumes and those positioned farther apart hear softer volumes—so that in some examples a participant's audio volume is increased or decreased by moving one's participant image closer or farther away from another participant; and in some examples side conversations are possible by separating two participants from the others by means of placing them farther and more distant from the others in the video stream image. In some examples the audio volume of all participants in the connection is the same and is not altered proportionate to the positions or distances between different participants. In some examples the audio can be rendered in 3-D based upon the relative positions of the participants so that surround sound, stereo or 3-D speakers may play each participant's audio dynamically adjusted so that it reflects the position of their image relative to the other participants in the combined video stream image, and sounds as if it relates to their position in the replaced place. In some examples all the participants are displayed. In some examples each participant is not displayed to himself or herself but instead all the other participants are displayed, as if they were in a meeting where each participant observes everyone else but not himself or herself. In some examples only some participants are displayed such as if one is in an audience at a presentation or briefing where only those seated in front of a participant are visible, while those seated behind a participant are not seen. In some examples one or a plurality of participants may change the replaced background at any time(s) during a connection so that a single connection about specific world problems may be experienced by one participant at multiple background locations such as in some examples starting in the White House's oval office, then moving to an environmental conservation center in the Amazon, then switching into an impoverished village under attack in Darfur. In some examples when a new identity joins a connection that new identity must accept the background already being utilized for that connection. In some examples when a new identity joins a connection that new identity may choose their own background for the connection, and in some examples may be able to switch backgrounds repeatedly throughout the connection by means of making their own selections at any time and having the appropriate combined foreground/background image(s) created.

Some technologies provide additional capabilities: In some examples real-time dynamic images are inserted into video image streams. In some examples these are rendered from the camera position that generates the image stream into which a dynamic image is inserted. In some examples the synthesized video stream is rendered from the viewpoint of the location of each participant. In some examples the synthesized video stream is rendered from a viewpoint different from the location of a participant. In some examples the inserted image is considered a target image that is inserted into a target area in the separate video image stream, such as in some examples by use of a three dimensional model so that a more realistic resulting image is produced. In some examples these generate a dynamic mask for removing the target area in the video image stream for inserting a target image into that target area. In some examples the inserted target image is a participant in a connection. In some examples the inserted target image is an advertisement(s). In some examples of inserted advertisement(s) the specific ad may be determined by the settings of an audience or a specific identity(ies) (such as in some examples a TP Boundary Management Service) so that the specific inserted ad(s) are tailored to each audience and/or audience member. In some examples one or a plurality of target images may be inserted in one or a plurality of target areas. In some examples these include segmentation maps. In some examples segmentation maps are superimposed over a new background image(s). In some examples two or a plurality of graphics layers are processed to generate blended graphics. In some examples the different images and/or graphics layers are received in different formats and may be converted to a common format such as in some examples MPEG streams, SDTV video, HDTV video, etc. In some examples background replacement is performed by blue screening, chroma keying, green screening, etc. in which a foreground image(s) is captured in front of a uniformly colored screen so that the screen's pixels may be identified as background pixels that may be replaced with a new background with a high degree of segmentation accuracy.

Some technologies provide transmission capabilities: In some examples the entire final video output is transmitted to a remote location and displayed as transmitted. In some examples the entire final video output is not transmitted, only the separated subject(s) or participant(s) or target image(s) with its (their) location(s) in the separate video image stream so that it (they) can be set in the same defined position(s) in the frame for display to a recipient, such as in some examples the image of a participant(s) and a background conference room may be combined and displayed for one participant while the image of the other participant(s) and a background British museum may be combined and displayed for a different participant. In some examples each participant may set the same connection in a different place and time (in some examples using recorded video and virtual places) so that one connection may simultaneously appear to each of its five participants to take place in a virtual business conference room where a virtual whiteboard is being used to display a presentation, in a 2-D recorded video of a limousine that is currently driving down Fifth Avenue in Manhattan, in a 3-D live stream from the nose camera on an airplane flying at the top edge of the Grand Canyon, with a live video stream from a coral head underwater on Australia's Great Barrier Reef, and inside a library's virtual card catalog with millions of immediately accessible resources—each of which may have the presenter and the presentation displayed in a different target area(s) in their separate video image stream of their different real, live, recorded, or virtual places. In some examples the steps to perform those different combinations for each participant in one connection include receiving a plurality of image streams from a plurality of sources, analyzing and separating the images into a plurality of background and foreground images, selecting the appropriate background and foreground images based on different selection criteria or conditions, mixing the foreground image(s) with the background image(s) to generate an output image for display—so for each participant the output is the appearance that the appropriate foreground image(s) are superimposed and blended into each different background image(s) creating a new and different synthesized image stream for each participant.

COMBINE PRESENCE, PLACE AND (OPTIONAL) CONTENT: FIG. 81, "Combine Presence, Place, Content (optional)," provides some examples of how the background of a focused connection may be replaced in whole or in part by a place; in some examples by content from a participant, a third-party or a service; in some examples by content that may include advertising; in some examples by a combination of a place and content that may include advertising; etc. In some examples each individual participant may choose to opt-in or opt-out of specific background replacements that may include a place, content (that may include advertising whenever "content" is included in a background), or a combination of a place and content. In some examples all the participants may choose together to opt-in or opt-out of specific background replacements that may include a place, content (that may include advertising whenever "content" is included in a background), or a combination of a place and content. In some examples any content replacement that includes advertising may be automatically opted-in more opted-out by means of an individual participant's boundary(ies) that may include a Paywall as described elsewhere. In some examples speech recognition may be employed to analyze the content of participants' audio communications and automatically modify the background to match relevant key words that are spoken. In some examples text analysis may be employed to analyze the text content of participants' text communications, presentations, applications, etc. and automatically modify the background to match relevant key words that are included. Therefore, in some examples the background place, content, content that is advertising, or any combination of background elements may be the same for all the participants but be changed dynamically based upon their spoken communications and/or the text content that is present. However, in some examples the background place, content, content that is advertising, or any combination of background elements may be different for each participant based upon their personal boundaries, their profile(s), or other individual choices made during the session by various user interface elements, selectors, widgets, etc.—making it possible for the participants to be present together simultaneously while each one's background appears to be a separate and different digital place.

Turning now to FIG. 81 a processing flowchart illustrates various options for combining presence, a place and content. In a sending option 3620 a sender may provide separation 3621 and replacement and blending 3630, then transmit it locally and/or over a network to other participants, as described in more detail elsewhere. In a receiving option 3620 a receiver may provide separation 3621 and replacement and blending 3630, then display the new combination and (optionally) transmit it locally and/or over a network to other participants, as described in more detail elsewhere. In a network alteration option 3620 a session may be intercepted and a separate application, server and/or service may provide separation 3621 and replacement and blending 3630, then transmit the new combination locally and/or over a network to other participants, as described in more detail elsewhere. In a combination option 3620 separation 3621 may be performed remotely from background replacement and blending 3630, in some examples a sender or receiver may separate their participant(s) image from their local background 3621 3622 3623 3625 and transmit their participant(s) image so that it can be included with a recipient's chosen background 3630 3631 3632 3633 3634; in some examples a recipient may receive multiple participants' images 3623 3625 so that they may all be included in the recipient's chosen background 3630 3631 3632 3633 3634. In each of these options 3620 (sending, receiving and/or network alteration) part or all of a new background may optionally be "locked" 3635. In some examples there is complete locking 3635 and the combined presence, place and/or content may not be changed. In some examples there is no locking 3635 and any recipient (including participants, network applications, network servers, external services, etc.) may modify any and all parts of the background, including advertising content. In some examples there is partial locking 3635 and in a first instance the background content (such as advertising) may be locked but the place (such as the location) may be unlocked then any recipient (including participants, network applications, network servers, external services, etc.) may modify the place (the location parts of the background), so that each participant sees a different background place. In some examples there is partial locking 3635 and in a second instance the background place (such as the location) may be locked but the content (such as advertising) may be unlocked then any recipient (including participants, network applications, network servers, external services, etc.) may modify the content parts of the background, so that each participant sees different content such as different advertisements.

Some examples of another step, Replacement and Blending 3630: In some examples various existing technologies may be employed to provide one or a plurality of steps for real-time background replacement 3631 in some examples using a live place in which one of the participants is located 3626 to replace the background 3631; in some examples using a live video and/or audio feed from a different place 3626 to replace the background 3631; in some examples using recorded video 3626 to replace the background 3631; in some examples using a designed or virtual place 3626 to replace the background 3631; in some examples using a recorded video 3626 (such as a segment of a movie or television show, or images from a movie or television show) to replace the background 3631; in some examples using a live or recorded connection 3626 to replace the background 3631; in some examples using another type of source to replace the background 3631; etc. Additionally, real-time background replacement 3632 may also consist of in some examples including advertisements 3628 to replace part or all of the background 3632; in some examples including various types of content 3628 to replace part or all of the background 3632; in some examples including marketing content 3628 to replace part or all of the background 3632; in some examples including paid messages of various types 3628 to replace part or all of the background 3632; etc. In some examples the background source 3626 3627 3628 employed for complete background replacement 3631 3632 or partial background replacement 3631 3632 may come from a third-party source or service such as in some examples advertising 3628; in some examples other marketing or paid content 3628; in some examples recorded content 3626; in some examples the known or hidden alteration of reality that is substituted at a "source" 3627; etc. In each example 3626 3627 3628 3631 3632 a background source may include video and/or audio with varied and controlled volume for the audio so that it may be present at the level desired without scaring or interrupting the participants at the place; in some examples compositing 3633 combines the visual elements from separate sources into a single image; in some examples blending and rendering 3634 the foreground 3625 and background 3624 3631 3632 to produce video output; in some examples (optionally) locking or partly locking the blended images as described elsewhere; and in some examples (optionally) leaving the output unlocked so that it may be separated and transformed again as described elsewhere.

In some examples the background/foreground modeling step 3622 includes constructing a background model 3622 (by any of the various known means) which may include methods for minimizing background noise, dynamically adjusting to specific environments such as shadows, lighting changes at different times of the day, lighting due to different weather conditions, etc. In some examples object segmentation 3623 is performed by creating a foreground mask for each frame (by any of the various known means). In some examples the foreground mask 3623 or separated foreground objects 3623 or selected foreground pixels 3623 may be filtered 3625 to clean the mask's or object(s)'s or pixel selection's boundaries or edges (by any of the various known means). In some examples the background selection 3622 3623 or separated background objects 3623 or selected background pixels 3623 may be filtered 3624 to clean the mask's or object(s)'s or pixel selection's boundaries or edges (by any of the various known means).

In some examples one or a plurality of foreground selections 3622 3623 3625 are an essential part(s) of the final combination 3620 (in some examples such as a participant[s]) and this foreground shape(s) is transmitted to the Replacement and Blending stage of this process 3630 3633. In some examples one or a plurality of background selections 3622 3623 3624 are an essential part(s) of the final combination 3620 (in some examples such as a participant in a live place where that place is the participant's desired background) and this background is transmitted to the first background replacement stage of this process 3630 3631. In some examples one background replacement step 3631 may employ live or recorded video 3626 from any local or remote source; in some examples the new background 3626 is dynamically stretched or cropped to fit the original video source's dimensions; in some examples the audio from the new background 3626 3624 is muted but in some other examples the audio from the new background 3626 3624 is dynamically adjusted to a volume that provides appropriate levels of sound (in some examples such as the natural ambient background sounds from a live or recorded place); etc. In some examples one or a plurality of additional background selections 3628 3627 are an essential part(s) or all of the final background 3620 (in some examples such as advertising 3628, in some examples marketing content 3628, in some examples paid messages 3628, etc. from any of a variety of sources including third-parties, vendors, services, and/or background; in some examples a digitally altered reality 3627 that may be substituted at the source as if it were the real reality and this "altered reality" source is transmitted to a background replacement stage 3632 (with or without informing the user that the source is an "altered reality") which may employ the substituted "altered reality" as if it were the "real reality" from that source 3631. In some examples this second background replacement step 3632 may employ recorded or live video 3628 3627 (including images) from any local or remote source; in some examples the new background 3628 3627 is dynamically stretched or cropped to fit the original video source's dimensions; in some examples the audio from the new background 3628 3627 is muted but in some other examples the audio from the new background 3628 3627 is dynamically adjusted to a volume that provides appropriate levels of sound (in some examples such as the natural background sounds from a recorded advertisement that is playing in a participant's background); etc.

In some examples the video is composited 3633 by overlaying or placing the foreground selections 3622 3623 3625 over a new background 3631 3632. In some examples some artifacts may remain from the separation steps 3621 3622 3623 3624 3625 such as in some examples additional pixels on the edge or boundary of one or a plurality of shapes that in some examples may create a halo or small distraction; and in some examples some artifacts may remain from the background replacement steps 3631 3632 such as in some examples additional pixels on the edge or boundary of one or a plurality of replaced backgrounds that in some examples may create background bleed through, too sharp a delineation between a participant and a background, or other distractions; and in these cases a blending step 3633 may be employed to mitigate or eliminate these; in some cases the edge(s) of foreground shapes 3623 3625 may be dynamically made transparent 3633 to show more of the new background 3631 3632; in some cases alpha blending may be employed 3633 such as blending foreground pixels on the edge of a shape with the new background pixels adjacent to them so that the foreground and background blend more seamlessly rather than abruptly; in some cases feathered edges may be employed 3633 such as softening the edge or border so that it blends into a background; in some cases any of the various known means or methods may be employed to create the illusion that various elements are part of the same scene.

These various steps and processes improve proportionately with the speed and capacity of the device(s) that perform them, and the technology(ies) and products used.

In some examples rendering 3634 produces the final video output, a step that dynamically produces the synthesized appearance of what is displayed to one or a plurality of participants. Because there are a variety of known rendering means, methods, processes and systems, various combinations of techniques and features may be employed to accomplish rendering; in some examples rendering is one part of a larger compositing 3633, blending 3633 and rendering 3634 step; in some examples rendering 3634 may be a stand-alone step; etc.

TP configurations for presence at a place(s): Some examples of providing TPDP at a place include options such as a sender 3640 is one option, a receiver 3647 is a second option, and a network alteration 3654 is a third option. A less obvious fourth option is to perform a network alteration 3654 but use that to replace an expected "real" and live source with an altered source 3663, to digitally transform reality in some examples with clear and visible indication that it has been transformed 3663, but in some examples to provide a digitally transformed reality as a hidden process without informing recipients of the transformation(s) or substitution(s) 3663. In some examples one of these options may provide presence at a single place; in some examples two or three of these options may provide new backgrounds that are completely different from each other such as when the background is a complete replacement; in some examples two or three of these options may provide new backgrounds that are partly different from each other such as when different advertising is included in some or each of the new backgrounds; in some examples each recipient may have a completely new background; in some examples an altered reality is substituted at a "real source" with or without informing the participants of the substitution (as if the altered reality were real). Taken together it is clear that TP digital presence has numerous initial differences from physical presence—and due to the potential configurations and options may be evolved rapidly beyond this initial scope.

Turning now to FIG. 82, "TP Configurations for Presence at a Place(s)," in some examples one option is a sender 3640 where a source is received 3641 such as in some examples from a local camera and microphone and in some examples from a remote source(s); separation 3642 (3621 in FIG. 81) is performed to separate the participant(s) from their background(s); the replacement background is acquired 3646 3643 (3626 3627 3628 in FIG. 81) or received; a background replacement(s) is performed 3643 (3630 3631 3632 in FIG. 81); the output video and audio is composited, blended and or rendered 3643 (3633 3634 3635 in FIG. 81); and the output is (optionally) compressed 3644, (optionally) encoded 3644 for transmission, (optionally) locked 3644, and streamed 3644. In some examples the source 3641 is locked so background replacement 3642 3643 is not performed. In some examples the background place 3646 3626 3627, content (which may include Tools or Resources) 3646 3628, content that is advertising 3646 3628, or any combination of complete or partial background replacement(s) may be different for each participant based upon their personal boundaries 3662, their profile (s) 3662, or other individual choices—making it possible for the participants to be present together simultaneously while each participant's background (that is, their "digital place") appears to be different. In some examples in the background advertising 3646 3628 fits a participant's Paywall and earns money for the participant simply by including the appropriate advertisements in their digital places, transforming everyday attention and awareness into a constant source of revenue (it is not as if people's awareness is notsold—attention is already sold to advertisers and the volume of messages sent by those who place the advertisements is huge, but currently those who provide the attention do not receive the revenue from the sale of their attention; in some examples, therefore, a Paywall boundary means that some or all of the revenue from selling one's attention is received by the person[s] who provides the attention that is bought by advertisers).

At a high level two or a plurality of senders 3640 and recipients 3647 are using devices that are attached to one or a plurality of networks 3645 in some examples an IP network 3645 such as the Internet, in some examples a Teleportal Network 3645, in some examples a PSTN 3645 such as a public switched telephone network, in some examples of another type of network 3645 such as a cable television network which may be configured to provide telephone (in some examples VOIP), in some examples a cellular network 3645 in some examples a plurality of disparate networks 3645.

In some examples another option is a recipient 3647 where most of the processing is performed by the recipient's device and separation 3650 and background replacement(s) 3651 are performed locally to each recipient (in some examples there are multiple recipients so each recipient may have a different background[s] in their version of the place). In some examples a source is received 3648 such as from a sender 3640 3644 or a network alteration 3654 3660; the input stream is received 3648, decompressed 3648 as needed, decoded 3644 as needed; in some examples the stream is locked 3650 so it is not separated 3650 and may be displayed directly 3649, or the recipient's image may (optionally) be added 3651 before it is displayed 3649; in some examples the recipient transmits the displayed stream 3649 3648 3653 so that the sender 3640 may receive it as a source 3641 and include the recipient's image 3653 as a participant in the place 3643; in some examples the sender 3640 will need to separate the recipient's image 3653 3642 from its background in order to include the recipient as a participant in the place 3643; in some examples the recipient 3647 performs separation 3650 (3621 in FIG. 81) to separate the participant(s) from their background(s), the replacement background is acquired 3646 3651 (3626 3627 3628 in FIG. 81) or received; in some examples a background replacement(s) is performed 3651 (3630 3631 3632 in FIG. 81); in some examples the output video and audio is composited, blended and/or rendered 3651 (3633 3634 3635 in FIG. 81); and the final output is displayed for the recipient 3649; in some examples the output video and audio is (optionally) compressed 3648, (optionally) encoded for transmission 3648, (optionally) locked, and streamed 3648 3653. In some examples the background place 3646 3626 3627, content (which may include Tools or Resources) 3646 3628, content that is advertising 3646 3628, or any combination of complete or partial background replacement (s) may be different for each recipient 3647 based upon their personal boundaries 3662, their profile(s) 3662, or other individual choices—making it possible for the participants 3640 3647 to be present together simultaneously while each participant's background (that is, their "digital place") appears to be a separate and different place. In some examples in the background advertising 3646 3628 fits a recipient's Paywall and earns money for the recipient simply by including the appropriate advertisements in their digital places, transforming everyday attention and awareness into a source of personal revenue and income.

In some examples another option is a network alteration 3654 where most of the processing is performed by a server, application or service accessible over one network 3645 or a plurality of disparate networks 3645. There are a number of reasons and methods for doing this. In some examples a recipient's device is resource limited such as a cell phone, PDA, pad, an older or smaller laptop or PC, etc. then separation 3657 and background replacement(s) 3658 may be performed where there are more resources such as in some examples a server 3654, in some examples another device accessible to the recipient such as an LTP or RTP or MTP that may be utilized by remote control 3654, in some examples an application accessible over a network 3654, in some examples a service 3654, in some examples wherever remote resources may be obtained 3654. In some examples a network alteration may be performed for any of a variety of other reasons such as in some examples the insertion of paid advertising in the background 3646 3657 3658, in some examples the provision of the same shared background location and content for all recipients 3646 3657 3658 such as at a sales presentation of a specific installation or physical facility, in some examples with multiple recipients network alteration 3654 3657 3658 may be utilized to provide each recipient with a different background(s) or advertisement(s) in their display, in some examples the substitution of an altered reality at a source 3663 3657 3658, or for any other reason whether paid or free. In any of these or other examples separation 3657 and background replacement(s) 3658 may be performed where there are more resources such as in some examples a server 3654, in some examples another device accessible to the recipient such as an LTP or RTP or MTP that may be utilized by remote control 3654, in some examples an application accessible over a network 3654, in some examples a service 3654, in some examples wherever remote resources may be obtained 3654.

In some examples of network alteration 3654 a stream is intercepted 3655 and a source is received 3655 such as from a sender 3640 3644 or from a recipient 3647 or from a different network alteration 3654 3660; the input stream received 3655 or intercepted 3655, is then decompressed 3656 as needed, decoded 3656 as needed; in some examples the stream is locked 3644 3659 so it is not separated 3657 and may only be retransmitted directly 3660; or the participant's image(s) may (optionally) be added 3651 before it is retransmitted 3660; in some examples the stream is partly locked 3644 3659 so only some background elements may be separated 3657 and only some background elements replaced 3658 such as in some examples inserting new advertisements 3658, in some examples changing the background place 3658, in some examples making only some other limited background change(s) 3658 before it is retransmitted 3660; in some examples in some examples the network alteration 3654 performs separation 3657 (3621 in FIG. 81) to separate the participant(s) from their background(s), the replacement background is acquired 3646 3658 (3626 3627 3628 in FIG. 81) or received; in some examples a background replacement (s) is performed 3658 (3630 3631 3632 in FIG. 81); in some examples the output video and audio is composited, blended and/or rendered 3658 (3633 3634 3635 in FIG. 81); in some examples the output video and audio is (optionally) compressed 3659, (optionally) encoded 3659, (optionally) locked 3659, and streamed 3660 or retransmitted 3660 or multicast 3660. In some examples the background place 3646 3626 3627, content (which may include Tools or Resources) 3646 3628, content that is advertising 3646 3628, or any combination of complete or partial background replacement(s) may be different for each recipient 3647 3640 based upon their personal boundaries 3662, their profile(s) 3662, or other individual choices—making it possible for the participants 3640 3647 to be present together simultaneously while each participant's background (that is, their "digital place") appears to be a separate and different place. In some examples the advertising 3646 3628 fits one or a plurality of recipients' Paywall (s) and earns money for the recipient(s) 3647 3640 simply by including the appropriate advertisements in their digital places, transforming everyday attention and awareness into a source of revenue.

"Reality replacement" business(es): In some examples the network altered video and/or audio 3654 3660 are substituted at one or a plurality of sources 3663 3646 without informing participants 3640 3647; while in some examples participants are informed that network altered video and/or audio 3654 3660 have been substituted at one or a plurality of sources 3663 3646. In some examples "reality replacement" applies whether participants 3640 3647 are combining their presence at a place 3646 3626 with or without additional content 3646 3628 and/or advertising 3646 3628. In some examples "reality replacement" applies when participants 3640 3647 are not present, and only a place(s), 3646 3626 are being combined with content 3646 3628 and/or advertising 3646 3628. In some examples "reality replacement" also applies to streaming video 3654 3660 via one or a plurality of disparate networks 3645 with one or a plurality of recipients 3647 and/or receiving devices 3647 and respective displays 3649 and/or speakers, such as may be used in some examples a view of a "live" place, a broadcast, a broadcast network show, multi-participant online events, backgrounds for online webinars or meetings for audiences, etc. Said reality replacement may include a server(s), database(s), application(s), service(s), buying system(s), payment system(s), paywall system(s), TP boundary(ies), etc. that determines which background replacement(s) to perform 3643 3651 3658 such as in some examples a whole and complete replacement, in some examples a partial replacement, in some examples more than one replacement such as a new place plus new content plus new advertisement(s). Said reality replacement is performed as described elsewhere such as in some examples by network alteration 3663 3654 3655 3656 3657 3658 3659 3660 where all of a background may be replaced 3658 and/or parts of a background may be replaced 3658; in some examples by sender replacement(s) 3663 3640 3641 3642 3643 3644 where all of the background may be replaced 3643 and/or parts of the background may be replaced 3643; in some examples by recipient replacement(s) 3663 3647 3648 3650 3651 3649 where all of the background may be replaced 3651 and/or parts of the background may be replaced 3651.

Some examples of businesses based upon hidden and/or known reality replacement(s) include: In some examples advertising replacement(s) may utilize advertising server(s), database(s), application(s), service(s), buying system(s), payment system(s), paywall system(s), TP boundary(ies), etc. that may be located in one or a plurality of places, services, communities, sources, etc. and in some examples may place or replace advertisements in backgrounds with specific paid advertising. In some examples real physical background place replacement(s) may be paid or free and utilize RTPs (Remote Teleportals), place server(s), database(s), application(s), service(s), buying system(s), payment system(s), paywall system(s), TP boundary(ies), etc. that may be located in one or a plurality of places, services, communities, sources, etc. and in some examples provide means to place participants at physical places like in some examples a theme park (such as in some examples of Disney World, Universal Studios Theme Park, Sea World, etc.); in some examples a city like New York or Paris that wants to attract businesses, business travelers, vacation tourists, etc.; in some examples travel destinations like Florida or Caribbean islands or (in ski season) Vail or Snowmass; or in some examples local users may receive backgrounds from parts of the city that would like to attract more residents and businesses like a financial district, the clubhouse at a new suburban development, etc. In some examples store, product and/or brand replacement(s) may be paid or free and utilize product image server(s), database(s), application(s), service(s), buying system(s), payment system (s), paywall system(s), TP boundary(ies), etc. that may be located in one or a plurality of places, services, communities, sources, etc. and in some examples provide means to replace specific parts of backgrounds with images such as by replacing appropriate electronics products with other electronics products such as Apple electronics or HP electronics; in some examples replace cameras with other cameras such as Nikon cameras or Canon cameras; in some examples replace big-box stores with other big-box stores such as Best Buy stores or Home Depot stores; in some examples replace fast food stores with McDonald's or Burger King outlets, or replace store signage in strip shopping centers with franchise signage such as Subway or Panera Bread; in some examples replace branding such as by identifying specific competing logos and names and replacing them with competing logos and branding such as replacing all networking logos with Cisco Systems logos or replacing all political party symbols and names with a new political party such as Libertarian or the "replacement party;" in some examples replace or add specific individuals simultaneously to multiple places or events so that any attempt to find that identity such as by face recognition will need to deal with a small to a large multitude of "presences" in a range of places and situations where a wide range of others present there will be able report having legitimately been "present" with that identity at that time and place (e.g., a "school of fish camouflage" strategy spread over a range of places).

Set TP presence in a place(s) with content: Some examples of methods, systems and services for storing, selecting, configuring and applying presence in varied places by both automated and manual selections are illustrated by FIG. 83, "Set TP Presence in Place(s) with Content" and FIG. 84, "Process 'Digital Places' and Content" together. In some examples a sender 3640 can specify a completely or partly replaced background(s) 3643 and cause a recipient 3647 to accept presence in that place with that replaced background(s) 3643. In some examples a recipient 3647 can replace all or part of the sender's background(s) 3651 and in some examples view their own replaced background(s) 3651, and in some examples cause the sender and/or other recipients to view their replaced background(s) 3651. In some examples a network alteration 3654 can intercept a transmission and provide a completely or partly replaced background(s) 3658 and in some examples cause one or a plurality of senders 3640 and/or recipient 3647 to view these replaced background(s) 3658 (with or without informing them that a replacement was performed during transmission).

In some examples various existing technologies may be employed to provide one or a plurality of means for selecting backgrounds jointly or separately such as in some examples transmitting a replaced background(s) and accepting it; in some examples including place identifiers in a session or message and passing those place identifiers between users' devices for acceptance or modification; in some examples locking all or part of a background so all participants are in the same "place;" in some examples approved or authorized "realities" (such as in some examples places, in some examples content, in some examples advertisements, etc.) may be pre-specified and stored in one or a plurality of servers, applications, databases, systems, etc. for rapid retrieval and use during sessions for presence together in a pre-approved place; in some examples a replaced background(s) that is unlocked may not be accepted so its recipient(s) and/or sender(s) may independently maintain part or all of their own backgrounds, places and/or content according to how they each independently set or configure their session.

Turning now to FIG. 83 some examples illustrate processes for setting presence and content (including advertisements) in a selected place(s). In some examples an initial step is to be in a focused digital presence 3730 such as an SPLS connection and focus it in a place 3730 or put content in its background 3730; in some examples an initial step is to be in a focused digital presence 3730 and receive a request to focus it in a place 3730 or receive a request to put content in its background 3730; in some examples an initial step is to be in a focused digital presence 3730 and have a different participant focus it in a place 3730 or put content in its background 3730. Automation and external network replacements may be processed such as in some examples an initial step is to be in a focused digital presence 3730 and have its place automatically changed 3731 or have content automatically put in its background 3731 either locally or by a network resource; in some examples an initial step is to be in a focused digital presence 3730 and receive an automated request to have its place changed 3731 or receive an automated request to have content automatically put in its background 3731 either locally or by a network resource; etc. In some examples a user's location-aware device and identity(ies) may be set to automatically join one or a plurality of Place SPLS's when that (logged in) identity and device physically enter a Place 3740; and in some examples it may be set to automatically exit that (those) Place SPLS's 3740 when the user and location-aware device physically exits that place. In some examples a user's location-aware device and identity(ies) may be set to automatically join one or a plurality of Event SPLS's when that (logged in) identity and device physically enter a place where an Event is located 3740; and in some examples it may be set to automatically exit that (those) Event SPLS's 3740 when the user and location-aware device physically exits where that event is occurring. In some examples a user's location-aware device and identity(ies) may be set to automatically join one or a plurality of other Identity's SPLS's when that (logged in) identity and device physically enter a place where that identity(ies) is located 3740; and in some examples it may be set to automatically exit that Identity's SPLS's 3740 when the user and location-aware device physically exits where that identity(ies) is located. In some examples when a location-aware Place SPLS 3740, Event SPLS 3740, Identity SPLS 3740 are entered, background changes are automatically made 3740 or suggested for approval or denial 3740. In some examples when a location-aware background is added either automatically 3740 or after manual approval 3740, a location-aware background may "follow" a user's current location to match a large physical location 3740 such as in some examples a big-box store's backgrounds 3740 throughout its multi-department interior; in some examples a university's backgrounds 3740 across its multi-building campus and inside various buildings; in some examples a corporation's backgrounds 3740 in its multiple campuses and buildings around the world; in some examples an airport's backgrounds 3740 in its differing sections such as parking, shopping, security, airline gates, etc.; in some examples a hotel's backgrounds 3740 in its different areas such as parking, lobby, restaurants, bars, fitness center, swimming pool, and hotel rooms (if permitted by privacy settings); in some examples a destination resort's backgrounds 3740 such as Disney World's multiple theme parks, hotels, golf courses, shopping, activities, theaters, clubs, etc.). In some examples an automated or external "place" and/or "content" replacement(s) 3731 3740 may be saved 3742 3737 as desired and retrieved as needed 3742 3737 such as in some examples to a TP user profile(s) 3737; in some examples to an identity's other user records 3737; in some examples to a directory(ies) profile 3737; in some examples to an external application's records 3737, in some examples to an external service's records 3737; in some examples to a governance's records 3737; etc. In some examples saving automated external "place" and/or "content" replacement(s) 3731 3740 may be saved with relevant attributes 3742 3737 such as in some examples attributes for when an automated "place" and/or "content" replacement 3731 3740 is to be performed automatically; in some examples attributes for when an automated "place" and/or "content" replacement 3731 3740 is to be performed only after making a request to a user and receiving approval (which may be by any known communication means such as static display, audio, video, interactive "agent", video avatar, animated character, overlay replacement in the current place, etc.); in some examples attributes for other known characteristics of a replacement 3731 3740 such as for its video properties, audio properties, device properties, network properties, display properties, storage properties, recording properties, or any other known capabilities.

In some examples a next step is to determine if the change of place and/or change of content came from a current SPLS member 3732 that is in the focused presence 3730; in some examples a next step is to determine if the request to change the place and/or content came from a current SPLS member 3732 that is in the focused presence 3730; in some examples a next step is to determine if the automated request to change a place and/or automated request to change content came from an authorized network alteration 3731; in some examples a next step is to determine if the automated request to change a place and/or automated request to change content came from a saved 3742 3737 location-aware replacement 3740; etc. If in some examples there is not authorization 3732 for a participant's change and/or request 3730, or in some examples if there is not authorization 3732 for an automated change and/or request 3731, then control is transferred to the appropriate TP connection service 3735 for the appropriate handling of an action that is not authorized, not accessible, not available, etc. This is handled by the appropriate TP Connection Service 3735 such as by preventing the action, displaying an appropriate message(s), listing steps that are permitted, displaying instruction(s) for how to correct this, etc.

In some examples a security code may or may not be required, and in some examples a security code is a payment code 3741 received from a ticket purchase or an entry fee payment; in some examples a security code is an entry code 3741 provided by a membership organization, a governance, a corporation, etc.; in some examples a security code is a security code, credential or key 3741 provided for security; in some examples a security code is another type of code 3741 provided as a valid form of proof. In some examples a security code is not required 3741 so the change(s) may proceed 3733. In some examples a security code is required 3741 such as in some examples a confidential place or background may be accessed and replaced (such as in some examples corporate offices, in some examples a military base, in some examples a private club or members-only location, in some examples any performance or industry conference or gathering requiring a purchased ticket, in some examples an invitation-only gathering, in some examples a private connection between friends who choose to maintain privacy or secrecy, or for any other security or privacy reasons). In some examples a required security code may be entered manually 3741; in some examples a required security code may be entered automatically 3741; in some examples a required security code may be entered by any manual or automated means such as copy/paste or drag/drop from a separate communication, stored file, third-party service, etc. 3741; in some examples a required security code may be entered by any other known means from any type of locally or remotely stored security code 3741 or certificate 3741 or authorization key 3741 or authorization service 3741; etc. If a security code is entered correctly 3741 and is approved in any of these or other examples the change(s) may proceed 3733. However, in some examples a security code is required but is not provided by a user 3741 and/or not entered correctly 3741 then control is transferred to the appropriate TP connection service 3735 for the appropriate handling of an attempted action 3741 that is secured but does not provide the approved security means 3741. This is handled by the appropriate TP Connection Service 3735 such as by preventing the action, displaying an appropriate message(s), listing steps that are permitted, displaying contact information to obtain help or a valid security code, etc.

In some examples an authorized SPLS member(s) 3732 makes the change of place and/or a change of content 3730, such as in some examples including an advertisement. In some examples an authorized SPLS member(s) 3732 requests a change of place and/or requests a change of content 3730, such as in some examples including an advertisement. In some examples an authorized network alteration 3732 makes an automated change of place and/or makes an automated change of content 3731 such as in some examples including an advertisement. In some examples an authorized network alteration source 3732 requests user approval for an automated change of place and/or requests user approval for an automated change of content 3731, such as in some examples including an advertisement. In some examples an authorized location-aware replacement 3740 makes an automated change of place and/or makes an automated change of content 3740 such as in some examples including an advertisement. If the background is completely unlocked 3733 in any of these or other examples the change(s) may proceed 3736 with replacement(s) (optionally) including a complete background replacement 3736, and/or (optionally) a partial background replacement 3736 with content and/or advertising, and/or (optionally) both a complete background replacement and content and/or advertising replacement(s) 3736. However, in some examples the background is locked against complete changes 3733 but is partly unlocked 3734 which permits partial change(s) 3736 such as in some examples maintaining a place but (optionally) including a partial background replacement with content and/or advertising, or in some examples maintaining the content but replacing the place 3736.

In some examples boundary management 3736 3737 is an important part of focusing a connection at a place 3730 3731, and/or in some examples replacing part of the background with content and/or advertising 3730 3731. Boundary management is determined by the TP Connection Service 3736 and by settings in the user's profile 3737 and/or other user records 3737 as described elsewhere. In some examples governances membership(s) and governance settings 3736 3737 may determine one or a plurality of boundaries as described elsewhere. In some examples after the boundary management context(s) is set 3736 3737 then replacements may be performed 3736 as described elsewhere such as in FIG. 81, and needs may utilize one or a plurality of database(s) 3738, server(s) 3738, application(s) 3738, service(s) 3738, buying system(s) 3738, payment system(s) 3738, paywall system(s)

3738, TP boundary(ies) 3738, etc. that determines the specific background replacement(s) sources to use and perform as described elsewhere, such as in some examples 3670 in FIG. 84 3739.

Process "digital reality place(s)" and content: Turning now to FIG. 84, "Process 'Digital Place(s)' and Content" some examples illustrate processes when a focused connection is combined with a place, content(s), advertising, etc. by fetching, acquiring and processing the varied components. Said processes begin with choosing to focus a connection in a place 3730 3731 3740 in FIGS. 83 and 3670 3671 and elsewhere, with or without content 3730 3731 3740 and 3670 3671 by means of a device that will do the image processing 3670. Said place(s), content, advertisement(s), etc. are requested for retrieval 3672 and may optionally include places 3680 3682 as described in 3626 in FIG. 81 and elsewhere (such as in some examples a live video and/or audio feed from a different place 3626, in some examples a recorded video from a place 3626, in some examples a designed or virtual place 3626, in some examples a recorded video 3626 such as a segment from a movie or television show, in some examples a live or recorded connection 3626, in some examples of another type of source 3626); and may optionally include content that is requested for retrieval 3672 3680 3683 as described in 3628 in FIG. 81 and elsewhere (such as in some examples advertisements 3628, in some examples various types of content 3628, in some examples marketing content 3628, in some examples paid messages of varying types 3628, in some examples other types of content or content sources 3628). The retrieval and/or streaming of places 3682 is only from trusted sources 3681, as is the retrieval and/or streaming of content 3683, ads 3683, images 3683, etc. only from trusted sources 3681. By means of various known technologies these 3682 3683 may be acquired in some examples as streams 3681, in some examples 3681 as a combination of files and/or streams 3681 (such as an initialization file with data about the environment, a program or configuration file with information about the appearance and/or behavior of the environment, the actual streaming media and/or media file which provides content stream or data, etc.), and in some examples by other known methods and systems. When the places 3682 3681, content 3683 3681, advertisements 3683 3681, recordings 3683 3681, etc. are acquired in some examples they contain behaviors 3684, size or scale measurements 3684, or other source or context information 3684 in which cases those behaviors, measurements, etc. are retrieved 3685 3681 or generated 3685. In some examples the places 3682 3681, content 3683 3681, advertisements 3683 3681, recordings 3683 3681, etc. do not contain behaviors 3684, do not contain size or scale measurements 3684, and do not contain other source or context information 3684 in which cases those are not retrieved or generated. In some examples at the completion of this acquisition process 3683 acquired places 3682, and/or content 3683, and/or advertisements 3683, and/or other sources are transmitted 3686, streamed 3686, etc. to the device doing the image processing 3670 3673. In some examples there are one or a plurality of video streams, data files, etc. 3686 3673 with varying resolutions, behaviors, etc. and in some examples there is discovery and negotiation of capabilities, preferences, etc. 3686 3673 including in some examples video reception capabilities 3673, in some examples video source capabilities 3681 3686, in some examples characteristics and attributes of a video stream 3686 3673, in some examples characteristics and attributes contained within a source data file 3681, etc.; and in some examples capabilities may be negotiated and transmission automatically adapted by means of logic operations applied to the capabilities, characteristics and attributes 3686 3673; and in some examples capabilities may be negotiated and transmission manually adapted by means of selections applied to the capabilities, characteristics and attributes 3686 3673; in some examples transmission adaptations may be. In some examples if the image processing device 3670 3673 receives behaviors 3674, size or scale measurements 3674, or other source or context information 3674 then these are utilized to scale and/or model the replacement 3675, compositing 3675, etc. In some examples the image processing device 3670 3673 does not receive behaviors 3674, nor size or scale measurements 3674, nor other source or context information 3674 then these are not utilized to scale, align and/or model the replacement 3675, compositing 3675, etc.

In some examples one or a plurality of foreground selections 3625 in FIG. 81 and/or background selections 3624 3626 3628 are composited and blended 3633 3676 with the resulting blended images generated 3677, as described elsewhere. In some examples one or a plurality of foreground selections 3625 in FIG. 81 and/or background selections 3624 3626 3628 are composited but blending is not performed so that the images generated 3678 are not blended images. In some examples the images are rendered 3678 to produce the final video output, as described elsewhere. In some examples the images, audio, video stream, etc. are encoded for transmission 3678. In some examples the rendered video stream is displayed for the user 3678 (whether the user is local or is located remotely). In some examples one larger step includes one or a plurality of processing steps such as compositing 3676, blending 3676 3677, rendering 3678, encoding 3678, local display 3678, etc. In some examples transmission is performed 3678 as described elsewhere.

As described elsewhere in some examples of "Reality Replacement" Businesses, it may have commercial value to substitute one or a plurality of synthesized combinations of identity(ies), place(s), content, advertising, and/or other components as if they were a "real source" that displays either live image(s) or a recording(s) of those visible components as if they were actually present together in a real place and time. Some examples of various "reality replacement" businesses include advertising (such as placing advertisements in the background of any real or virtual place); places to meet around the world (such as desirable places where a local government may want tourists to visit such as in a palatial room in the Forbidden City in Beijing or at the nightly sunset celebration at Malory Square in Key West, Fla.; product or brand marketing (such as replacing all brands with one vendor's offerings (such as replacing all fast food stores with Wendy's outlets, or all television sets with Sony models), "school of fish" privacy camouflage for individuals (such as digitally placing one person, identity, cloned or simulated devices in use, etc. in a plurality of places simultaneously so their real location is kept private by making that extremely difficult to obtain midst a distribution of one or a plurality of types types of simultaneous presences).

In some examples the rendered output 3678 may be used as a selective reality alteration 3688 of sources 3681. In some examples a digitally altered reality 3678 is received 3689 by a networked reality alteration application 3654 in FIG. 82; in some examples it is received by a networked reality alteration server 3654; in some examples it is received by a networked reality alteration service 3654; in some examples it is received by a recipient 3647; in some examples it is received by a sender 3640; in some examples it is utilized for a reality substitution by a sender before transmission 3640; etc. so that, in summary, reality substitution may be performed in any part of an architecture and/or process(es) for TP configurations for presence and content at a place. In some examples a key step for preparing a reality substitution(s) 3688 at a source(s) 3680 3681 is to format the digitally altered output (s) 3678 3689 3690 to match the source(s) output(s) 3681 3690; in some examples this is performed automatically by obtaining and matching what is required to the source's capabilities 3681 3690; transmission format(s) 3681 3690; transmission attributes 3681 3690; bandwidth 3681 3690; related types of source file(s) 3681 3690 such as initialization files, environment programs, media file types, etc.; source file(s) structure(s) 3681 3690; and/or other attributes 3681 3690; and utilizing preprogrammed logic to match (as closely as possible) the digitally altered output(s) 3689 3690 with the target source 3681 that will deliver the substituted altered reality. In some examples a subsequent key step is to substitute the altered output 3678 3691 at a "real source(s)" 3681. In some examples this substitution may be hidden and secret 3691 3681; in some examples this substitution may be made visible and the users kept informed 3691 3681 that a "real source" has been replaced by one or a plurality of digitally altered output constructs.

In some examples the digitally altered output 3678 may be used manually as a chosen reality alteration 3688 for subsequent background(s) replacement(s) 3673. This provides the means to create a combination of identity(ies), place(s), content, advertising, etc.—with or without recording it—and then utilize that combination is if it were a "real" source as a component of subsequent combinations. In some examples the means to do this are the same as previously described (such as receiving synthesized digital output 3678 3689, formatting that to match a source(s) 3690, and providing that as if it were a "real" source—but in this case providing it directly as input 3673 to subsequent combinations.

TP INTERACTING GROUPS AT EVENTS OR PLACE (S): A plurality of businesses, education, social services, events, activities, etc. may be enabled by making it possible for several or a plurality of identities to interact at a place with content (including advertising). In some examples a world-leading college or university may offer degrees, certificate programs, classes, etc. globally. MIT already offers Open Courseware at ocw.mit.edu, over 120 foreign universities offer bachelor's and master's degree programs in Singapore, and hundreds of accredited schools offer online degrees. There could be continuity in the suggestion that the best college classrooms could add a plurality of TP students—both those schools and those students benefit from combining presence at a place with the addition of content and applications as needed.

Among other education examples, some public schools are in need of improvements as demonstrated by their decades-long stagnation of student achievement, drop out rates, etc. Using student achievement metrics it is relatively easy to data mine teacher and student performance records (while preserving anonymity if desired) to identify the best teachers so that the students who need it may have TPDP in their classes—even if the students are located in a different classroom, a different school, a different city, a different state, or even a different country. In some less well performing school districts TP students could gain access to the best teachers and classes, with their achievement metrics tracked to confirm the improvements in their educations. In some examples this may even occur with US students (whether in home schools or public schools) attending classes in foreign classrooms where students significantly outperform students in the local US public school(s). Since the best teachers can't be spread thin enough to personally assist these TP students, the students' local teachers could provide them assistance—so TP students would gain both the best teaching and more personalized help with learning. (If some teachers unions are unwilling to participate, TP students could be assisted by local university students who help them as tutors, by charter school teachers, by private teachers, by virtual tutors, etc.).

Another example is news conferences where blank images of any newsroom (such as in some examples the White House briefing room, in some examples a Pentagon newsroom, in some examples any state or local government's newsroom, or in some examples any corporate briefing room) could be populated by a combination of real identities (such as elected public representatives) to provide press briefings to audiences that include news reporters, bloggers and members of the public. All may be TP presences, which produces a society where large numbers may have open and direct access to news sources and celebrities (whether elected representatives; actors, musicians and authors who are promoting their movies, music, book, etc.; corporate executives who sell products; etc.).

Another example is government. In some political examples citizens could have direct TPDP with elected representatives at all levels of democratic government throughout the public times of their days, whether they are with congressmen and senators in Washington, with governors and state representatives in state capitals, or with county and city commissioners in local communities. Elected representatives are employed by and responsible to the people they represent, yet they are currently more interested in the needs of the PAC's (Political Action Committees), corporations, unions, and wealthy individuals who provide most of their campaign financing. If citizens could be immediately present at all public times with their representatives, and if elected representatives could have TPDP at any time with the citizens who elected them, then democratic government might be more responsive to citizens' needs. Similarly, government administrators of social programs, regulatory agencies, infrastructure projects, etc. could work hand-in-hand with the individuals and communities they serve. Those who their programs serve could be at their side when they are in the public parts of their jobs, and government managers could be on-site at their programs to make sure they provide what the citizens' tax dollars are supposed to deliver.

Another example is an identity's choice of a synthesized reality it is constructed from a growing number of individual events until they may eventually he come continuous. In some game examples a person can select one or a plurality of identities in a synthesized reality such as choosing to enter and/or remain as long as events are available in a "Star Wars Universe" (in some choices as a visitor to one event, in some choices at occasional events, in some choices as a part-time frequenter of multiple events, and in some choices as full time as is available). In a synthesized Star Wars Universe, one could choose an identity on the dark side with a "home" such as on the Death Star and a role such as one of its commanders or a storm trooper officer; or one could choose an identity on the good side with a home in a rebel base and role as one of its Jedi Knights; or one could choose a plurality of identities and roles in the Star Wars Universe and switch between them by logging in and out of each identity. "Star Wars events" could be run by various logged in identities or groups, with participants and their real-time images able to meet at "Star Wars events" by technologies, methods, processes and systems as illustrated herein.

Similarly, in some examples other synthesized realities may be chosen, promoted or provided by an employer, a governance, a corporation, a religion, a country, etc. such as a "company world" in which to do one's job with fellow workers (such as a global consulting firm serves global clients with teams located throughout the world); in some examples a "customer world" provided by a global corporation (such as a giant food and beverage company whose objective might be something like capturing the meal preparation and sustenance needs of one-eighth of the world's stomachs); in some examples a "governance world" provided by a governance (such as an environmental governance whose objective might be transforming millions of personal and family lifestyles so they have neutral impact and are environmentally sustainable over centuries), etc. In these examples synthesized reality (ies) may be provided that members, citizens, and/or employees could experience more and more events until they can live "there" some or all of the time and participate in its culture, values, practices, beliefs, behaviors, etc.

Numerous other examples are possible, with some examples various social or public events like "getting together" at homecoming each year with friends and classmates from the college or high school you attended; being "present" for a Presidential candidate's victory speech on election night; "celebrating" the sunset nightly at Mallory Square in Key West, Fla.; "dropping in" at a weekly talk by famous authors for college writing students; "going to" any meeting where any group, team, community, company, union, association, governance, etc. is getting friends, neighbors, co-workers, or others together to do anything.

Turning now to FIG. 85, some examples illustrate processes for combining an interacting group of a plurality of presences with a place, an event, an activity, content, advertising, etc. At a high level one or a plurality of senders 3700 are providing one or a plurality of blended outputs 3704 of a place, event and/or an activity over one or a plurality of networks 3705 such as networks that are described elsewhere in more detail. In some examples a plurality of senders may include an announcer and performer(s) such as in some examples an announcer and a physically present or remotely located speaker before a partly live and partly remotely located audience, in some examples the stage of a club (like a comedy club) some of whose comedians are located remotely, in some examples a group of remotely located entertainers performing on one "stage", in some examples a group of remotely located experts in a panel discussion, in some examples a group of remotely located actors and actresses performing a play set in a real but distant place, or in some examples any combination of senders to together provide one output from a place, event and/or activity—collectively called an "event" in these examples. In some examples the audience may be partly physically present at a real event in which one or more of the senders is physically present and partly recipients who are remotely located; in some examples the audience may be not present where any sender is physically located but the event may still have some audience members who are physically present in one location and some recipients who are remotely located; in some examples there may not be any physical event but one or a plurality of senders may produce the output of a constructed event and all of the audience may be remotely located; in some examples there may be other combinations of physical presence and remote presence by senders and by audience members at events.

In some examples an option is one or a plurality of senders 3700 (such as described in more detail in FIG. 82, "TP Configuration for Presence at a Place(s)") which includes in some examples a live source(s) 3701; in some examples separation of a participant(s) from their background(s) 3702 such as separation of remotely located speakers, actors, performers, etc. from their backgrounds; in some examples acquisition of replacement background(s) 3706 and/or content 3706 (which may include advertising, Tools, Resources, etc.); in some examples performing one or a plurality of background replacements 3703; in some examples combining a plurality of sources such as a plurality of remotely located senders 3700 who are actually recipients 3647 in FIG. 82 who transmit their stream 3711 3724 so that a sender 3700 may receive it as a source 3701 and include the recipient's image 3711 3724 as a participant in the place 3703 (in some examples the recipient separates their presence from their background 3650 and transmits the image of their presence only 3711, but in some examples the sender 3700 separates the recipient's image 3724 3702 from its background in order to include the recipient as a sender in the event or place 3703); in some examples producing the output 3703 (such as by compositing, blending, rendering); in some examples streaming the output 3704 (such as by compression, encoding, (optional) locking, streaming). In some examples the locking and background replacement options are as described elsewhere, so that in some examples the combination(s) of background replacement(s) may be different for two or a plurality of audience members 3707 3708 3709 3710 so the audience may be present together at an event (or in some examples watching a recording of an event) while parts of each background (such as advertising or other background content or objects) may be different for one or a plurality of participants (in some examples providing participants personalized advertising or messages for each of them while "present" at an event, whether the customization occurs during live streaming or during the observing of a recording, and whether or not each receives Paywall payments or another type of benefit for receiving personalized advertisements or messages); and in some examples what is received is locked for two or a plurality of the audience so they are present together at an event with the same background.

In some examples the audience(s) 3707 are observers who are present at an event and in some examples most of the processing is not performed by the recipients' devices 3707 3708 3709 3710 which are primarily used for display; and in some examples where the audience 3707 are observers most of the playback processing may be performed by each recipient's device(s) 3707 3708 3709 3710; in some examples displaying and playing the event 3707 3708 3709 3710 is the main processing needed (as described elsewhere). In some examples that parts of the event may be customized for one or a plurality of audience members including advertising, messages displayed, etc. In some examples event customization includes direct retrieval 3707 3712 of customization attributes or parameters from an audience member's TP user profile 3713, user records 3713, etc., or it includes network retrieval 3711 3705 3712 of an audience member's TP user profile 3713, user records 3713, etc. In some examples event customization includes using the customization attributes or parameters to perform separation 3707 3708 3709 3710 (as described elsewhere), in some examples retrieved content (which may include Tools or Resources) 3706, in some examples retrieved advertisements 3706, in some examples retrieved components 3706, in some examples retrieved objects 3706, etc. In some examples event customization includes background replacement(s) 3707 3708 3709 3710 (as described elsewhere). In some examples event customization includes compositing 3707 3708 3709 3710, blending 3707 3708 3709 3710, and/or rendering 3707 3708 3709 3710 the customized or personalized event as a single synthesized construct. In some examples an event may provide multiple views simultaneously; so audience participation may include selecting one or a plurality of views to display, either with or without customization as described elsewhere. In some examples the audio from an event may differ depending on each viewpoint and view selected (such as in some examples the audio placement in a 3-D or surround sound system; in some examples the audio lag due to the physical distance between the source and the location of the viewpoint selected; in some examples additional audio processing such as overlaying music, other real sounds from the event, virtual tracks, etc. on the audio; etc.). In some examples a plurality of views of an event may be selected for simultaneous split-screen display, and in this case one of the audio tracks would be selected as the audio played during a split-screen display.

In some examples the audience(s) 3707 are more then observers—they may also be "participants" by interacting with other audience members 3707 3708 3709 3710 who are present at an event—in other words audience members actively "participate" by meeting and interacting with others while attending an event (regardless of whether this is a planned meeting of two or a plurality of identities who know each other, or an unplanned meeting of strangers). The process for meeting in a place with the automated or manual addition of content, advertising, etc. is described elsewhere in more detail. In brief, just as one real or virtual place 3646 in FIG. 82 (including its audio) may be used as the background for multiple separate and disparate meetings that occur simultaneously at that "place," an event 3700 3704 (including its audio) may be used as the background for multiple separate and disparate meetings that occur simultaneously at that "place"—but are between audience members who are present at that event 3707 3708 3709 3710. In some examples much of the processing for meetings at events is performed by the recipients' devices including separation of each recipient from his or her background 3707 3708 3709 3710, receiving the event (and its audio) as the background for participants' side interactions during an event 3707 3708 3709 3710, background replacement of these participant meetings with the event as their background 3707 3708 3709 3710, rendering/displaying meetings between participants at the event 3707 3708 3709 3710, transmitting the recipient's presence at the meeting 3711 so that can be used by another meeting participant 3724 (in some examples the recipient separates their presence from their background 3708 3709 3710 and transmits the image of their presence only 3711 3724; in some examples the sender 3700 separates the recipient's image 3708 3709 3710 3711 3724 3702 from its background in order to include the recipient as a sender in the event or place 3703). Some examples of the processing performed by recipients devices 3707 3708 3709 3710 may include a plurality of steps some of which may include receiving a source such as from one or a plurality of senders of an event 3700 3704 3705 or from a network alteration sender of an event 3722 3720, determining if the stream is locked or may be separated (and if locked displaying it with only format conversion if needed), receiving the streams from the other participants in the meeting at the event 3707 3708 3709 3710 3711 3705 and (if needed) separating the participants from their backgrounds, decompressing the input streams as needed, decoding them as needed, combining the meeting participant(s) image(s) with the selected event background (though in some examples the participant will transmit a stream with the event background already replaced and rendered; in some examples the participant will transmit a stream with their image only already separated from the background), in some examples a background replacement(s) is performed to combine participant (s) image(s) with the event as a meeting background; in some examples the output video is composited, blended and/or rendered in one or a plurality of separate steps; in some examples the final output is displayed for the meeting participant; in some examples the displayed output is compressed, encoded for transmission, (optionally) locked, and streamed. In some examples an event may provide multiple views simultaneously, so in these examples participant meetings include the step of selecting between multiple source views of the event 3700 3704 (in some examples each source view may include its own audio, while in some examples all the source views may have the same audio, and in some examples no audio might be provided) to choose which event background is wanted for each meeting at the event.

In some examples the process of focusing connections includes joining an "event SPLS" where everyone in the audience who chooses to join this SPLS 3707 3708 3709 3710 may be one of its SPLS members, and each of these "event SPLS" members may choose their own visibility at the event (such as described elsewhere such as 3590 in FIG. 79). In some examples an identity that is present 3707 3708 3709 3710 may focus a connection with any other identity that is present 3707 3708 3709 3710 (just as a physically present person in a physical event audience may talk to another physically present person who is there). In some examples an identity who is present and in the event's SPLS 3707 3708 3709 3710 may see another identity who is present and in the event's SPLS 3707 3708 3709 3710 and retrieve additional information on who is that other identity (such as by means of a directory or other information retrieval such as described elsewhere), to use the additional retrieved information to decide whether or not to focus a connection with that other identity 3707 3708 3709 3710; in some examples one may search an audience present at an event based on one or a plurality of attributes to determine who is present that matches a desired profile, and then focus a connection(s) with one or a plurality of identity(ies) who match the profile. In some examples an identity who is present may join the "event SPLS" but use their visibility options to remain invisible and hidden, yet still be able to view the "event SPLS" audience, look up individual audience members' profiles, and/or search the audience for a subgroup that matches a particular type of profile or attributes. Optionally, in some examples a member of the "event SPLS" may choose to not make visible (e.g., make invisible) some or all of the other event SPLS members present. In some examples an audience member may not join the "event SPLS" in which case their identity is not displayed as present to the members of the "event SPLS," but in some examples an SPLS member may choose to display an unnamed icon, figure, avatar, or other symbolic representation (and optionally) with or without identification.

In some examples an audience member 3707 3708 3709 3710 may want to attend the event with one or a plurality of SPLS members from one or a plurality of their current SPLS's (not the "event SPLS"), even if those other members are located remotely in any other location; in some examples this utilizes one or a plurality of servers 3714 that may be accessed over one or a plurality of networks 3705 3712 or may be accessed directly 3707 3708 3709 3710 3714; in some examples this utilizes one or a plurality of services 3714 that may be accessed over one or a plurality of networks 3705 3712 or may be accessed directly 3707 3708 3709 3710 3714; in some examples this utilizes one or a plurality of applications 3714 that may be accessed over one or a plurality of networks 3705 3712 or may be accessed directly 3707 3708 3709 3710 3714; in some examples this utilizes one or a plurality of other SPLS identification capabilities 3714 that may be accessed over one or a plurality of networks 3705 3712 or may be accessed directly 3707 3708 3709 3710 3714. In some examples SPLS identification 3714 identifies and shows the SPLS members present in the audience who are members of one or a plurality of a person's SPLS's, with that person able to select which identity(ies)'s to show as present in the audience; in some examples with that person able to select which SPLS's are included for each identity chosen as present; in some examples an option is to show only the members of selected open SPLS(s) 3714 who are present; in some examples an option is to show the members of selected closed SPLS(s) 3714, that is those who are present with whom they share a selected closed SPLS(s) even if the SPLS is currently closed; in some examples an option is to show the members of a person's entire range of SPLS's for two or a plurality of their identities 3714, that is those who are present with whom they share any SPLS in any of their identities; in some examples an option is to show any SPLS members who are present 3714 from any combination of a person's identities and/or SPLS's. In these examples 3714 the server(s) 3714, service(s) 3714, application(s) 3714, etc. accesses that identity's and/or that person's TP user profile 3713 and/or user records 3713 to determine its SPLS members, and perform a lookup on each of the selected SPLS(s) members' current location and presence (if logged in and/or available as described elsewhere), then displays those present SPLS members on the person's device(s) in use as described elsewhere.

In some examples an event may have one or a plurality of individually customized components (such as content, advertising, objects, different views, etc.) that are displayed differently for one or a plurality of audience members 3707 3707 3708 3709 3710 that are based on the audience members, with most of this customization processing done by the recipients devices. In some examples a modified component may be advertising, in some examples a modified component may be content or messages, in some examples other types of content and/or background objects may be personalized or customized; in some examples this customization of what one or a plurality of audience members see 3707 3708 3709 3710 may be based on their TP user profile 3713, their TP user records 3713, the TP boundaries and audience member has set 3713, a governance that they may have joined 3713, etc.; in some examples this utilizes one or a plurality of servers 3712, services 3712, applications 3712, etc. that may be accessed over one or a plurality of networks 3705 3712 or may be accessed directly 3707 3708 3709 3710 3712. This makes it possible for one or a plurality of audience member(s) at an event to see different versions of the event simultaneously based on their individual boundaries, their profiles, their user records, their choices and preferences, etc.

In some examples the event may have one or a plurality of individually customized components (such as content, advertising, objects, different views, etc.) that are modified by network alteration 3722 where most of the processing is performed by a server(s), service(s), application(s), etc. accessible over one or a plurality of disparate networks 3705. In some examples this is done because one or a plurality of audience members devices 3707 3708 3709 3710 are resource limited (such as described elsewhere) so any modifications needed in the event's stream are performed remotely 3722 by resources attached to the network. In some examples this is done because one or a plurality of individual audience members 3707 3708 3709 3710 are programmatically intended to receive one or a plurality of different background components (such as personalized content, advertising, logos, objects, components, etc.) by virtue of their TP user profiles 3713, user records 3713, boundary settings 3713, etc. In some examples this is done because one or a plurality of groups of audience members 3707 3708 3709 3710 are programmatically intended to receive one or a plurality of different background components (such as personalized content, advertising, logos, objects, components, etc.) by virtue of their group membership; in some examples citizens of a particular nation, in some examples customers of a sponsoring corporation, in some examples members of a particular governance, in some examples students at a particular educational institution, or in some examples for any of multiple group membership reasons. In some examples this is done because an event has multiple different audiences either in real-time during the event (in which case different audiences may see different variations of the same event), or because an event has multiple different audiences over time (in which case there can be different displays of the event such as for the real-time audiences, scheduled re-broadcasts of the event, on-demand broadcast of the event to individuals, on-demand viewing of segments or snippets of the event, etc.) and in each of these cases the event may be modified in some examples for each whole audience, in some examples for groups in an audience, and in some examples for individuals in an audience. In some examples there may be other attributes that determine the performance and transmission of network alteration(s) 3722. In some examples of events with two or a plurality of audience members 3707 3708 3709 3710 network alterations 3722 may be utilized to provide each audience member with one or a plurality of different advertisements, content, objects, components, etc. in their individual displays, as described elsewhere. In some examples of network alteration 3722 a stream is intercepted 3715 and a source is received 3715 such as from a sender of an event 3700 3704, in some examples from an audience member 3707 3708 3709 3710 if participating in a meeting at the event with said audience member, in some examples from a different network alteration 3722 3720; the input stream is received 3715 or intercepted 3715 and then decompressed 3716 if needed, and decoded 3716 if needed. In some examples the stream is locked 3704 3719 so it is not separated 3717 and may only be retransmitted directly 3720; or in some examples such as in a meeting by participants at an event the individual audience member(s) participants' image(s) may (optionally) be added 3718 before it is retransmitted 3720. In some examples the stream is partly locked 3704 3719 so only some background elements may be separated 3717 and only some background elements replaced 3718 such as in some examples inserting new advertisements 3718, in some examples changing objects or components in the background event 3718, in some examples making only some other limited background change(s) 3718 before it is retransmitted 3720. In some examples the network alteration 3722 performs separation 3717 before replacing the appropriate part(s) of the background 3718 for the appropriate audience members 3708 3709 3710, groups of audience members 3707, and/or an entire audience 3707. In some examples the output video and audio is composited, blended and/or rendered 3718. In some examples the output video and audio is (optionally) compressed 3719, (optionally) encoded 3719, (optionally) locked 3719, and streamed 3720 or retransmitted 3720 or multicast 3720.

In some examples an altered reality 3721 may be substituted at the source(s) 3701 3700 of an event (as described elsewhere) so the sender(s) of the event 3700 3704 believe the event is real as they received its source(s) 3701 but it is in fact an alteration of a real event 3721 or a synthesized construct of an event 3721. In some examples the senders 3700 and/or audience(s) 3707 know that it is an altered reality 3721 or know that it is a synthesized construct 3721, and in some examples the senders 3700 and/or audience(s) 3707 do not know that it is an altered reality 3721 or do not know that it is a synthesized construct 3721 that has been substituted at the source(s) 3701 as if the event were "real." In some examples this enables changing an event and substituting that altered event 3721 at the source 3701 (such as changing what happens at the event, who is "present" at the event, the content or advertising or messages displayed at the event, etc.). In some examples this enables the recording of an event (such as recording the "presence" of the various identity[ies] in the audience at an event 3700 3707), and then the reuse of that recording to add additional new audience participants 3707 who were not there, as if they were present at that place during that event; in some cases this may include new recordings of new participants 3707 having a meeting with the recorded event 3700 as their meeting background such that a subsequent recording of their meeting is a synthesized alternate reality 3721 that shows their presence 3707 at the event 3700, even though they did not "attend" it. Thus, if an identity's presence is required at an event (such as being present for various events by a government, governance, group, etc.) then this requirement might be "met" in a variety of real and/or non-real ways.

In some examples event information may be entered 3724, stored 3724 3725, and/or retrieved by one or a plurality of event sources 3700; or in some examples by one or a plurality of event audience members 3707, or in some examples by a network server, service, application, etc. 3722. Event entries 3724 may be stored in one or a plurality of locations such as in some examples temporary storage 3725, in some examples one or a plurality of databases 3725, in some examples an event location service's storage 3725 such as a PlanetCentral GoPort (such as in FIG. 87), in some examples any type of network accessible storage 3725. Said entries may include attributes such as one or a plurality of names for an event, and one or a plurality of other attributes such as description(s), date(s), time(s), location(s), sponsoring organization(s), participant description(s), goal(s), purpose(s), and any other attributes desired. Said stored entries 3725 may be retried and edited in some examples by one or a plurality of event sources 3700; in some examples by one or a plurality of event audience members 3707, or in some examples by a network server, service, application, etc. 3722. Said stored entries 3725 may be retrieved and used in some examples by one or a plurality of event sources 3700; in some examples by one or a plurality of event audience members 3707, in some examples by a network server, service, application, etc. 3722, in some examples by a presence-aware application(s) 3455 in FIG. 73, in some examples by a presence-aware service 3456, in some examples crawled, indexed and (optionally) cached by an external search provider 3455 3456, in some examples by an event finding and connecting service such as PlanetCentral GoPort(s) 3457 and 3760 in FIG. 87 (including any of its display or access means such as maps, dashboards, search, top lists, APIs, other means, etc.), in some examples for sending "push" alerts or notifications 3781, or in some examples by other means for other purposes.

In a brief summary of some examples, one may "be present" at an event in a number of ways; in some examples by joining an event SPLS and being fully visible as one's real image to some or all of those present, or using one's visibility options to show only an anonymous icon, avatar or symbolic representation without identification; or using one's visibility options to be invisible and hidden while observing others; and regardless of one's own visibility or lack of it, looking up the identities and information of selected others whether by looking up a specific identity's information or by searching on one or a plurality of attributes to determine who is present that matches a desired profile. In a summary of some other examples, one may attend an event and quickly locate others who are members of one's own SPLS(s)'s and are present at the event, and determine them by selecting or deselecting the SPLS's of one's various identities and each of their SPLS's to see which of each SPLS's members are present so they are available to interact with such as in a focused connection at the event. In a summary of some other examples, an audience member who is present as a participant and not just as an observer may focus a connection with any other(s) who are present as participants and not just as observers. In a summary of some other examples, altered realities may be substituted for an event, including what happens at the event, who is shown as present at the event, so that event recordings may not constitute a reliable indicator of what actually happened at an event or who was in attendance at the place, and may not be reliable "evidence" of actual events or presences.

Scalability and/or fault tolerance: FIG. 86, "Scalability and Fault Tolerance," illustrates some examples of architecture for scaling a fault tolerant TPDP presence deployment. Even though presence operates as one or a plurality of entities, operating on larger scales creates needs such as scalability, fault tolerance, identification of presence events, selecting and connecting into events, etc. In some examples one or a plurality of presence deployments may grow so that system requirements include connected global, regional, country and/or local presence services, failover requirements for continuity in case any part of a presence system becomes unavailable, etc.

In some examples an example architecture includes three or more copies of a presence server such as S1 3751, S2 3752, and a server farm 3750 which in some examples includes multiple presence servers; wherein each presence server 3751 3752 3750 provides a presence service in a redundant way to example users 3744 3745 who in some examples utilize TP devices 3744, in some examples utilize subsidiary devices 3745 that are run such as by a VTP or a RCTP, in some examples utilize TP devices such as RTPs or AIDs/AODs (not shown in FIG. 86), in some examples directly utilize a subsidiary device as their device in use (as described elsewhere in more detail); wherein some examples said client device(s) 3744 3745 sometimes communicates directly with a presence service 3750 3751 3752, and in some examples said client device(s) 3744 3745 sometimes communicates with a registration component 3746 3747 that in turn communicates with a presence service 3750 3751 3752. In some examples each of these 3750 3751 3752 may be a presence application running on servers in a redundant way; in some examples each of these 3750 3751 3752 may be a presence system or process running on servers in a redundant way; in some of these redundancy may be provided by other means. In some examples redundant copies of the presence service 3750 3751 3752 employ the same data image(s) for presence as illustrated at the bottom of FIG. 86—herein illustrated by two replicated DBM processes DB System XY-1 3753, DB System XY-2 3754, combine two pairs of replicated databases DB X1 3755, DB Y1 3756 and DB X2 3757, DB Y2 3758 into two individual consolidated data images 3753 3754 that are presented to the redundant presence servers 3750 3751 3752—but in some examples may include a plurality of databases such as those exemplified elsewhere in more detail (such as in FIG. 73).

In some examples an example architecture illustrates how each presence server 3751 3752 3750 obtains state information from the other presence servers, so that if a server fails (such as S2 3752) another working server (such S1 3751) can take over the processing from a failed server. In some examples the state information is distributed by a registration component 3746 3747 (which is described elsewhere such as 3449 in FIG. 73) which in some examples sends state messages, updates, changes, etc. to each of the presence servers 3750 3751 3752. In some examples each presence server 3750 3751 3752 registers for events from the other presence servers 3750 3751 3752 so that each registration component 3746 3747 provides presence servers with state information from other presence servers. In some examples a plurality of registration components 3746 3747 are in the architecture to enable redundant distribution of state information; in some examples each presence server 3750 3751 3752 receives events from a plurality of registration components 3746 3747 but because redundant state notification delivers multiple copies of state changes, a server ID and counter is included in each state value or message to enable removal of duplicates when duplicates are received.

If one of the components fails—such as in some examples a presence server 3750 3751 3752; in some examples a registration component 3746 3747; in some examples a consolidated data image 3753 3754; in some examples a database(s) within a consolidated data image 3755, 3756 or 3757, 3758; in some examples an external presence-aware application(s) and/or service(s) 3748 3759—this failure is detected and managed by any known means such as in some examples a "heartbeat," and the client(s) of the failed component can automatically logon (or in some cases manually logon) to any other working component, as illustrated in some examples by the dashed lines between users 3744 3745 and presence servers 3750 3751 3752; in some examples illustrated by the dashed lines between registration components 3746 3747 and presence servers 3750 3751 3752 (and vice versa); in some examples illustrated by the dashed lines between consolidated data images 3753 3754 and presence servers 3750 3751 3752 (and vice versa); in some examples illustrated by the dashed lines between services that utilize presence data (such as in some examples "PlanetCentral(s)," "GoPort(s)," "Alerts," "Notifications," etc. 3748 3743) and presence server S1 3751 and/or registration component 3746; etc. A logon after a failure in some examples follows normal procedures for logon, and in some examples is unnecessary because the redundant components are already operating together in a larger presence service. In some examples after a failure of a component the presence service includes a working presence server(s), a working consolidated data image(s), a working registration component(s), and the needed current state information to provide presence services.

In some examples presence data (such as from presence server S1 3751 and/or registration component 3746) is utilized in some examples by clients 3748, in some examples by services 3748 3743 (such as in some examples "PlanetCentral (s)," "GoPort(s)," "Alerts," "Notifications," etc. 3748 3743 which are described elsewhere such as in FIG. 87) and when these uses are complete in some examples a new focused connection is the result 3749, in which case it is implemented by means of a device such as in some examples a TP Device 3744; in some examples it is implemented by a Subsidiary Device 3745; in some examples it is implemented by a Subsidiary Device 3745 that is in use as a main and direct device.

PLANETCENTRAL(S), GOPORT(S), EVENTS ALERTS, PORTALS, EVENTS SEARCH, ETC.: As defined herein events, places, constructed digital realities and streaming TP sources are termed "events." Just as there are Shared Planetary Life Spaces (SPLS's) for individuals, groups, etc. there are one or a plurality of services, applications, servers, systems, processes, etc. that are meta-aggregations of real-time or near real-time user state information, places, constructed digital realities, streaming TP sources and/or records of events identification information, that provide a new type of participatory social navigation and/or media that turn digital presence at events, places and constructed digital realities into new ways to connect and/or live together.—in some examples with the ability to navigate (find, select, connect to, participate in, etc.) events (which, as defined, include places and constructed digital realities) taking place at any time; in some examples being alerted to the availability of certain types of events or occurrences; in some examples locating a place (as described herein); in some examples including an internal or third-party payment systems if a "ticket" or fee is required for a focused connection to an event; in some examples entry of a security code or membership credential if required to make a focused connection to an event; etc.

In some examples one or a plurality of PlanetCentrals and/or GoPorts may each have one or a plurality of possible names for the actual interface(s), client(s), module(s), component(s), widget(s), etc. that in some examples provide means to find, browse, navigate, etc. one or a plurality of events; in some examples a GoPort(s) provides means to select between similar or dissimilar events, and in some examples a GoPort(s) provides means to connect with an event to become in some examples part of its audience, in some examples one of its observers, in some examples a participant in the event, etc. In some examples PlanetCentrals provide aggregated presence information to other applications, services, servers, etc. that are not GoPorts. In some examples PlanetCentrals and GoPorts are independent of the technical specification of a presence service(s), SPLS connections, the network(s), presence architecture(s), digital realities, or other specifics of the underlying technologies or their implementation(s). Instead, in various examples PlanetCentrals and GoPorts are separate systems, methods, processes, etc. for aggregating state information to show how digital presences are currently being used and places and digital realities are currently being provided so that aggregated "current (presence) events" may be made visible, accessible, navigable, connectable and participatory by others—and this may include a broad picture of a presence system's public digital presences; or it may include specific public or private subsets of the presence system's digital presences; etc. In some examples state information is received 3771 from a presence service 3752 in FIG. 86 and from (optionally) a registration component 3747 by one or a plurality of PlanetCentrals 3760 and/or GoPorts 3760 that collect and aggregate presences, events, places, types of activities, or other attributes (as collectively called "event" herein and described elsewhere) that include a plurality of presences at a place. In some examples event information is accessed by retrieving stored event data 3777 (as described elsewhere) by one or a plurality of PlanetCentrals 3760 and/or GoPorts 3760 where said retrieved event data is entered in some examples by one or a plurality of event sources 3700 3724 3725 in FIG. 85; in some examples by one or a plurality of an event's audience(s) 3707 3724 3725; in some examples by one or a plurality of participants in an event 3707 3724 3725; in some examples by a network application or service 3722 3724 3725; in some examples by another(s) who has knowledge of an event(s) 3700 3707 3722 3724 3725; and in some examples by others who can make use of said data.

Is it possible to have a more interesting globally connected lifestyle without having to spend a lot of money for it? In some examples PlanetCentrals 3760 and/or GoPorts 3760 provide access to connections at or within "current events" by sorting and reporting digital events 3752 3747 3760 3777 in real-time or near real-time so they may be found, selected and (optionally) connected to and/or participated in—with each identity choosing what appeals to him or her by using attributes like size (the number of people present), the rate of growth of events (where are people "flocking" right now), by types of locations (top places in top cities, best natural events like migrating herds or active wild waterholes, digital rites at ancient civilizations' sites, etc.), types of events (biggest parties, best shopping, most dramatic news events, live firefights in shooting wars, etc.), various types of digital realities, etc. In some examples PlanetCentrals 3760 or GoPorts 3760 report a presence system's (or a presence service's) top events and places so that people can know "Where's the action now?" and "How big is this?" and "Can I get some of the action?" and "What's the hottest digital reality?" and "What new kinds of digital realities should I try?" and one or a plurality of other types of "event" questions.

In some examples this is displayed by a native PlanetCentral 3760 or GoPort interface 3760 (which native interfaces or interface components are referred to herein as "PlanetCentral clients"), and in some examples this is displayed by alternative clients, applications, services, etc. that access presence data as described elsewhere in more detail, such as 3455 3456 in FIG. 73 (which external interfaces or interface components are also referred to herein as "PlanetCentral clients"). In some examples PlanetCentral clients 3760 access the full presence data set and provide access to a wide range of current events (which are compiled aggregations of presence data) and provide means to navigate 3760, filter 3760, search 3760, select 3760, connect 3760, etc. from that range; and in some examples PlanetCentral clients 3760 accesses a subset(s) of presence data and provide access to those data subsets of events (which are compiled aggregations of subsets of presence data) such as events that are free (such as those that can be joined without any type of charge or cost), events that are social (such as those that are entertainment or personal focused and are not based on news events, are not commercial, are not political, etc.), events that are open (such as those that can be entered without any purchased ticket, affiliation, membership, or other type of pre-existing paid or unpaid connections), events that are commercial (such as those that are business to customer and require a ticket or entry of a security code, those that are business to business, etc.), as well as various other types of events. In some examples PlanetCentral clients 3760 may also be parts of other applications, services, portals, widgets, search engines, etc. so that presence in events that may be viewed and connected may be accessed from a plurality of applications and services. In some examples PlanetCentral clients 3760 may be implemented and/or packaged in a range of ways using many known methods by which applications, widgets, components, modules, etc. may interwork with each other; in some examples via local COM (Component Object Model) objects; in some examples as XML Web Services (as defined by W3C standards); in some examples as CORBA objects (Common Object Request Broker Architecture); in some examples Java Beans (from Sun Microsystems); in some examples from any other known implementation technology(ies). In some examples implementation 3760 is cross-platform and independent of one operating system or application execution environment.

In some examples PlanetCentral interfaces provide one or a plurality of means for accessing aggregate presence data as events that together constitute a new type of social media, with some examples provided 3760 and illustrated (map 3761, dashboard 3762, search 3763, top lists 3764, API 3765, other 3766). In some examples an event may take "place" at various types of locations such as in some examples real locations, in some examples non-real locations, or in some examples hybrid locations. In some examples a real location is a physical place such as the Eiffel Tower in Paris, Harrod's Department Store in London, a temple in Angkor Wat, Cambodia, etc.; in some examples a non-real location is a non-real or virtual place such as a "geometry land" constructed by a plurality of teachers or education vendor(s) for mathematics students, a virtual game world constructed for kids or adults, a photo-realistic surface of Mars constructed from real NASA photographs or video clips; in some examples a hybrid location is a combination of real and non-real places such as a simulated Forbidden City Throne Room in Beijing, China, or an archaeologically restored Pompeii party room with fragile erotic frescos and mosaics (which are normally inaccessible because they are real physical places that can be seen from doorways but physical entry and use are not allowed) but these may be made into a digitally usable "places" even if not physically accessible in reality.

In some examples a map 3761 functions as a PlanetCentral client element to display aggregate presence data (such as from a presence service 3752 and/or presence registration 3747 and/or stored event data 3777) based on the geographic placement of "real," "non-real" or "hybrid" locations of currently occurring "events." In some examples 3760 a map PlanetCentral client element 3761 may display current presence events in North America, and would be navigable by any known map navigation interfaces such as in some examples clicking one or a plurality of clicks on locations to zoom in at multiple levels of granularity; in some examples dragging zoom in/out sliders; in some examples using zoom in/out widgets; in some examples using navigation widgets to scroll; in some examples entering a city name or specific street address to jump to that location; in some examples entering the name of a landmark or business to jump to that location; in some examples pointing at an event's location or name to see detailed event information displayed, in some examples pointing at an event's location or name to see an access menu or access links displayed, etc. In some examples a map PlanetCentral client element 3761 may be simultaneously utilized by a plurality of users who simultaneously employ a plurality of devices in use so that a single map element can provide event navigation, access and connection/participation at scale.

In some examples a dashboard 3762 functions as a PlanetCentral client element and enables rapid visibility of categories of events (such as in some examples a plurality of dashboard widgets or components) selected by different attributes (such as in some examples types of locations; in some examples types of events; in some examples size and numbers present; in some examples the rate of growth or shrinkage of an event or of a key event attribute(s); in some examples type of business, industry, profession, technical field, sport, or a specific sports team; in some examples any other attribute(s) that may be used to specify a particular type of dashboard). In some examples of any one type of dashboard 3762 events may be compared with each other so that a user(s) may select between them such as in some examples by rankings; in some examples by graphs; in some examples by lists; in some examples by ratings; and in some examples by any known dashboard interface, component, modules, widget, alert, threshold, or other appearance or technique. In some examples of dashboards 3762 any widget may be drilled into for additional details on its type of comparison such as for one example one list of events may turn out to be population (such as the average number present in the most recent time period, such as the most recent 15 minutes), and in another example another list of events may turn out to be rate of growth (such as the percentage increase or decrease in the number present during the most recent time period, such as the most recent 30 minutes). In some examples a dashboard component 3762 may be expanded to display more events so that a wider range of events may be found using in some examples a specific attribute; in some examples a type of selection widget; in some examples a type of built-in dashboard sorting; in some examples a type of attribute or criteria; etc. In some examples any event listed on a dashboard 3762 may have its details displayed by means such as in some examples pointing at it; in some examples clicking it; and in some examples any other selection means; and/or in some examples connecting into the event(s) or participating in the event(s) by selecting it by any known means then focusing the connection as described elsewhere in more detail; or by other known joining or participation means. In some examples a dashboard PlanetCentral client element 3762 may be utilized simultaneously by a plurality of users so that a single dashboard (especially one that includes options for multiple categories with multiple types of components, widgets or other displays) may be simultaneously utilized by a plurality of users so that a single PlanetCentral dashboard client element can provide event navigation, access and connection/participation at scale.

In some examples search 3763 functions as a PlanetCentral client element and enables finding events searched for by different names or attributes (such as in some examples by type of location 3763 (example keywords "Boston's big July 4th fireworks celebration"); in some examples by location name (example keywords "Hong Kong's Felix bar"—a famous Hong Kong watering hole with spectacular skyline views and clientele); in some examples by type of events (example keywords "Saturday shopping at Bangkok's Chatuchak market"—the largest flea market in the world); in some examples by size or the number of presences (example keywords "Kumbh Mela festival on Ganges River"—17 million pilgrims at the January 2007 festival); in some examples by the rate of growth or shrinkage (example keywords "fastest growing political event in the United States right now"—ideal for political junkies; example keywords "largest after-work happy hour party right now"—ideal for an attitude adjustment after leaving work any day); in some examples type of business, industry, profession, technical field, sport, or a specific sports team (example keywords "register for digital marketing conference San Francisco"); in some examples any other keywords that may be used to initiate a search. In some examples search 3763 as a PlanetCentral client element provides means to search for events (as broadly defined herein) with in some examples an underlying search engine that works by any known search technologies and search means, and in some examples the search results presented in any known format of search results. In some examples search 3763 lists events according to relevance; in some examples search 3763 lists events according to a different priority that is set by the search engine's configuration; in some examples search 3763 lists events according to a user-selected priority that may be changed dynamically at any time a user chooses by various types of user preferences (which may be saved in a user profile or in other types of search configuration data); in some examples search 3763 may mine event data if data is available at the level of a structured and/or named event(s) (such as event data 3777). In some examples as a presence-based event grows in popularity an interface may be utilized by one or a plurality of sources or attendees 3777 and 3724 3725 in FIG. 85 to name the event and/or list other attributes and/or descriptions about it. In some examples a search PlanetCentral client element 3763 may be simultaneously utilized by a plurality of users who simultaneously employ a plurality of devices in use so that a single search element can provide event discovery, identification, access and connection/participation at scale.

In some examples a "top list(s)" 3764 functions as a PlanetCentral client element and enables highly simplified visibility of categories and lists of events ranked in some examples by system selected attributes and in some examples by user selected attributes (such as in some examples the number present at an event; in some examples the relevance of an event to a particular professional interest such as hematology; in some examples the relevance of an event to a social interest such as an appearance by the world's #1 golfer; in some examples multiple categories are displayed in a top list client element with a top events list visible under each category when it is opened; in some examples a top lists client element is displayed and when selected multiple categories may be browsed, navigated, searched, etc. to select and display each one's top events list; in some examples any top list may be expanded one or a plurality of times to show more items in that category or list; in some examples any top list may be sorted and/or filtered by one or a plurality of attributes so that specific types of events may be brought to the surface where they may be selected easily such as in some examples the combination of location (such as the city of Cambridge, Mass.) with field of interest (such as education) with the name of the school (such as Harvard Law School's Berkman Center for Internet and Society) with the topic of interest (such as open sessions at the Internet & Society Conference)—so that interested people may be present at selected sessions; in some examples any known lists interface, components, module, widget, or other appearance or technique may be employed to provide access to categories and lists. In some examples an event in a list 3764 may have its detailed display by various means as described elsewhere. In some examples an event in a list 3764 may be connected into it, or participated in it, by selecting it by any known means than focusing the connection as described elsewhere in more detail, or by other known joining or participation means. In some examples a top list(s) PlanetCentral client element 3764 may be utilized simultaneously by a plurality of users so that a single top list(s) client element (especially one that includes options for selecting between multiple categories with each category displaying its own list that may be expanded, sorted, filtered, etc.) may be simultaneously utilized by a plurality of users so that a single PlanetCentral top list(s) client element can provide event identification, access and connection/participation at scale.

In some examples an API (application programming interface) 3765 provides an interface for other software programs to interact with PlanetCentral functions so that other applications, services, portals, widgets, search engines, etc. may find and display presence events so that users of those other software programs may access, connect with, and participate in a plurality of presence events. In some examples API's may be made freely available so that PlanetCentral functions, features, client elements, etc. may be included without charge; and in some examples API's may be released based on licensing in order to create licensing revenues as well as quality standards for their implementations. API's are well-known technologies with common API examples such as the Google Maps API Family, the Twitter API, the Flickr API, etc. In some examples a PlanetCentral API 3765 may be utilized simultaneously by a plurality of applications, services, portals, widgets, search engines, etc. so that a single PlanetCentral API can provide event identification, access, connection/participation, and other features at scale.

Various types of alerts and notifications 3772 (referred to herein as "alerts") are described elsewhere in more detail, and in some examples some alerts may be created, chosen, stored, edited, retrieved, activated, deactivated, deleted, etc. (referred to herein as "managed") in TP user profiles 3780; in some examples some alerts may be managed in TP user records 3780; in some examples some alerts may be managed in one or a plurality of a person's directory entry(ies) 3778 such as in each identity's directory entry 3778; in some examples some alerts may be managed in other user data sources 3779 such as in some examples an identity's presence settings such as 3585 in FIG. 79; in some examples some alerts may be managed in other applications 3455 in FIG. 73 or in other services 3456; in some examples some alerts may be managed by an identity's ARM boundary settings; and in some examples some alerts are managed by other means. In some examples one or a plurality of alerts are retrieved 3781 from one or a plurality of sources of alerts; in some examples said retrieved alerts 3781 are maintained as a list of current alerts 3782; in some examples current alerts are utilized to identify "current events" 3783 or "triggers" 3783 that match one or a plurality of alerts 3781 3782; and in some examples an alert or notification is sent 3784 to the appropriate identity(ies) about the existence or availability of a "current event."

By means of "push" alerts, notifications, etc. 3772 3784, in some examples other PlanetCentral client elements 3766 may enable creating "current events" by identifying potential events and alerting a plurality of identities who may be attracted to a place so that new spontaneous "events" occur. In some examples users may form a crowd, audience, participants, etc. at a "place" where a celebrity(ies) is spotted 3766 by means such as face recognition, celebrity alerts, notifications, etc. 3784; in some examples alerts 3784 while a violent crime or a property crime is being committed 3766 may alert interested identities to be present to watch the crime as it occurs; in some examples alerts 3784 of live fire in a battle or skirmish in an active shooting war 3766 may attract audiences from both sides of the conflict, and they may be able to interact with each other with new possible new impacts on the conduct or outcome of war—or possible new ways to expand the ways to wage war with digital presence(s); in some examples alerts 3784 may attract audiences and school classes to wild African watering holes when an African herd such as Buffalo in some examples visits the watering hole 3766 (by means such as RTPs with motion and animal sensors and automated alerts tied into notification systems); in some examples alerts 3784 may open newsworthy events 3766 to audiences or new types of participation (in some examples as observing audiences only, and in some examples as participants who may ask questions) such as in some examples a presidential news conference, in some examples a public state insurance commission meeting that is considering increasing home insurance rates, in some examples at any type of government meeting that affects citizens whether it is a Washington bureaucrat or a local elementary school principal; in some examples alerts 3784 may allow presences at any current activity or incident 3766 where there is sufficient interest to attract observers or participants.

By means of "push" alerts, notifications, etc. 3772 3784, in some examples other PlanetCentral client elements 3766 may enable notifying broadcast networks 3773 (as described elsewhere), other media 3773, bloggers 3773, etc. Who may manually or automatically establish presence and broadcast a "current event" 3773 or provide notification to their audiences 3773, and in turn provide event information so a plurality of members of a plurality of audiences may see the event 3773 3774 or learn about the event 3773 and have the option of choosing personal presence at the event 3773 3767 3774. In some examples broadcast networks 3773, media channels 3773, blogs 3773, etc. may be built on the identification and broadcasting of specific types of spontaneous "current events" such as in some examples "celebrity spotted" events 3766 3784 3773, in some examples "a crime is occurring" events 3766 3784 3773, in some examples war battles, skirmishes, live fire, etc. events 3766 3784 3773, in some examples major wildlife sightings 3766 3784 3773 or African watering hole activities 3766 3784 3773; in some examples "breaking news" events 3766 3784 3773; in some examples "latest incident" networks, media, blogs, etc. that auto-broadcast or auto-notify anything that has sufficient interest to attract observers and/or participants 3766 3784 3773.

In some examples PlanetCentral(s) 3760 or GoPort(s) 3760 may report types of locations and activities such as in some examples: Nature: As humanity's impact grows unsustainable, nature's remaining unspoiled wild places become more remote, protected and harder to visit as a traveler, but using them as immediately enjoyable backgrounds will help conserve them by avoiding unnecessary visits and human pressures—while making them easily accessible parts of everyone's lives; from Africa's remaining wild herds of elephants, hippos, giraffes, buffalos, zebras and antelopes to its scenic Victoria Falls, Mt. Kilimanjaro, and misty gorilla-filled forests of Virunga National Park; from underwater on Australia's Great Barrier Reef to the Seychelles Aldabra Atoll and Palau's Rock Islands in the South Pacific; from Nepal's Mt. Everest to China's mist-covered Guilin mountains to Hawaii's active Kilauea volcano; from the rapids down in the Grand Canyon to Argentina's giant Igazu waterfall to Yellowstone's Old Faithful geyser; none of the earth's natural treasures needs to be out of reach or out of mind, when they can actually be as close as the nearest Teleportal.

Great cities/Top places in cities: The greatest places in the world's greatest cities have treasured spots that the most accomplished travelers might visit once or twice in a lifetime, but instant presence can make them the every day meeting places for numerous simultaneous but separate meetings; from meeting in Louis XIV's Hall of Mirrors in France's Versailles palace to giving a presentation in Catherine II's Hermitage Theater in Russian St. Petersburg's Hermitage, from the many magical outdoor spots along the "triumphant line" that starts in Paris' Tuileries gardens then goes to the Louvre museum and down the Champs-Elysees to atop the London Eye with its stunning view of Westminister Palace, Big Ben the Thames River and London's skyline; from the quiet places inside Tokyo's Sensoji Temple to those at Jerusalem's holiest sites and other holy places around the world, rather than being rare experiences humanity's treasured places may become the backdrop for everyday living.

Ancient civilizations: From Stonehenge to Machu Picchu, from the Roman Colosseum to the frescoed mansions of Pompeii, from Israel's Masada to Cambodia's Angkor Wat, from China's Great Wall to the Taj Mahal, humanity has repeatedly produced epic achievements that can become the daily places where people meet to conduct business and enjoy connecting during their digital lives.

Greatest art, sculpture, museums, gardens: To see and experience art one must visit each original piece of art in its one location around the world, which is almost impossible in a solely physical world. From the world's great galleries in museums like the Louvre and the Hermitage to the sculpture garden at New York's MoMA (The Museum of Modern Art), from the large permanent collection rooms of Amsterdam's Van Gogh museum to the balcony over the waterfall at Frank Lloyd Wright's Falling Waters, immediate digital access makes the distance vanish between people's everyday lives and the world's greatest art, sculpture, gardens and architecture.

Best stores, malls, shopping: The world's best shopping appears to be everywhere because Japanese cameras, Paris fashions and Italian shoes can be bought in most cities around the world. But the best shopping experiences still come from the original stores. Consider buying a custom-made suit at a tailor's shop on London's Savile Row with its traditions, fabrics, and personal service; or visiting Harvard Book Store to attend its Author Event Series with a major literary author, then lingering in one of its aisles before making a selection; or browsing through Manolo Blahnik's home shoe store on New York's West 54th St.—whether visiting these in reality or digitally, this is more like pilgrimages then like a quick stroll through a local upscale store.

Biggest parties and celebrations: All year long the world's biggest and best parties are in season—and can be made into events for direct TP attendance so the world's celebrations may be a lifestyle instead of a life's dream. From the "high points" at New Orleans' Mardi Gras to Germany's Oktoberfest, from the sexiest spectacles at Brazil's Carnaval to the most fearsome experiences at Pamplona's Running of the Bulls, from Times Square on New Year's Eve to San Francisco's Gay Pride Day Parade, from Nevada's Burning Man to Asia's massive religious festivals—and then on to join beach parties everywhere with toned, tanned and bikinied bodies (such as Miami Beach's SoBe [South Beach], Thailand's Haad Rin Beach, Ibiza's Playa d'en Bossa Beach, Mykonos' Paradise Beach, and the uninhibited fun of college Spring Break in Daytona, Cancun, Jamaica and everywhere else college kids enjoy the vacations they'll never forget), and then recover and rejoice at idyllic picture-perfect beaches like Crystal Cove in Barbados, Cabo San Lucas Arches in Mexico, Caneel Bay in St. John US Virgin Islands, Jimbaran "Sunset Beach" in Bali, Matira Beach in Bora Bora, Beau Vallon Beach in the Seychelles or any of hundreds more . . . . Life in a digital Paradise could become a daily soundtrack, instead of a distant song whose notes are never heard.

In these examples and others that may be provided as adaptations of these types of digital events, the vision and practice of digital reality(ies) may grow until these are more powerful, more desirable and more "real" to some than their local and limited working, eating and sleeping through their "every day lives" in physical reality.

Attending a free, paid or restricted event(s): In some examples a user has located an event by means of a PlanetCentral 3760 or a GoPort 3760, and in some examples a user has received an alert, notification, etc. 3772 3784; and in some of these examples a user may choose to focus a connection with an event 3767 3774, in some examples to observe it 3767 and in some examples to participate in it 3767. In some examples the event 3767 is free and open 3768 and in these examples the user can use an appropriate device 3769 to focus a connection with the event 3769 (as described elsewhere); and in some examples the user may (optionally) join the "event SPLS" 3769 (as described elsewhere).

In some examples after learning of an event 3760 3772 a user may choose to focus a connection with an event 3767 3774 but in some examples the event is not free to attend without payment 3768, and in some examples the event is not open to the public 3768 so an appropriate entry code is required such as 3741 in FIG. 83 and elsewhere. In some examples an event requires payment to attend 3768 and in these examples a user may (optionally) buy a ticket 3785 and after completing the purchase receive a payment code 3785 or an entry code 3785. In some examples an event is not open to the public 3768 and in some examples a user may (optionally) submit proof of an appropriate membership 3786; in some examples a user may (optionally) submit a security code 3786; in some examples a user may (optionally) submit a credential 3786; or in some examples a user may (optionally) submit another form of proof that is required to focus a connection with the event 3786. In some examples an event is not open to the public 3768 and in some examples a user may (optionally) register for membership 3786, in some examples register for an event 3786, in some examples form any type of association that permits entry 3786, and in any of these examples receive a membership code 3786, and entry code 3786, etc. Upon submission of any of these 3787 (such as in some examples a payment code 3785, in some examples an entry code 3785, in some examples a membership 3786, in some examples a security code 3786, in some examples a credential 3786, in some examples in other form of proof 3786) the user may be accepted or denied 3787, 3741 in FIG. 83, and elsewhere; and if accepted in some examples the user can use an appropriate device 3769 to focus a connection with the event 3769 (as described elsewhere); and in some examples the user may (optionally) join the "event SPLS" (as described elsewhere).

In some examples nothing acceptable is submitted 3787 (such as in some examples a valid payment code 3785 is not submitted, in some examples a valid entry code 3785 is not submitted, in some examples a valid membership 3786 is not submitted, in some examples a valid security code 3786 is not submitted, in some examples a valid credential 3786 is not submitted, in some examples another valid form of proof 3786 is not submitted) and in these cases a focused connection is denied 3788 in some examples, is blocked 3788 in some examples, is disconnected 3788 in some examples, etc. and in these cases control is transferred to the appropriate TP connection service 3788 for the appropriate handling of an action that is not authorized, not accessible, not available, etc. This is handled by the appropriate TP Connection Service 3788 such as by preventing the connection, displaying an appropriate message(s), listing steps that are permitted, displaying instruction(s) for how to correct this and make a connection, etc.

In some examples a free event 3768 or an open event 3768 gains sufficient popularity that its free or open access is restricted 3775, or it may be restricted for a different reason 3775. In some examples those who focus a connection to the event when it is a new and rapidly growing event are let in free, which leads to a "be first to connect" attitude or "connect quickly" mentality among potential audiences, because after some events become popular new entrants 3775 are diverted to a gatekeeper step 3785 3786 such as in some examples buying a ticket 3785; in some examples registration 3786; in some examples submitting a credential 3786 such as membership, security code, etc.; in some examples registering one's identity and contact information with an event sponsor 3786—and if the new entrants fail at the gatekeeper step 3787 they are denied their desired connection 3788. This technology 3775 3785 3786 3787 3789 3788 (which may also be implemented as a method, process, system, application, service, third-party service, "Ticketmaster" service, etc.) may lead to event-driven attendance businesses in which "real" events, "simulated" events, or "staged" events are provided as free, open or accessible events 3768—but if any event becomes popular enough it is quickly converted to a restricted event 3775 that requires buying tickets 3785, registration 3786, membership 3786, etc. to be permitted a focused connection. In some examples newly restricted events may also immediately gain paid sponsors who receive potential customers' registration and contact information 3786 in return for an unpaid admission. In some examples this may include selling tickets/registration to focus a connection on a live battlefield during a shooting war; in some examples this may include selling tickets/registration to focus a connection during the commission of a crime; in some examples this may include selling tickets/registration to focus a connection at a celebrity's wedding, to be present at the birth of their child, to be an invisible (audience) "guest" at their Sunday barbecue, etc.; or in some examples any real event, simulated event or staged event where enough will attend even if they must pay money, join or register to focus a connection and have presence at the event. In some examples the revenue (such as in some examples from tickets 3785, and in some examples from sponsors 3786) are split between those who are in the event, the place where the event is located, a ticket-selling service, and any others who may have an interest in creating or participating in the event. In some examples celebrities make money from their "sightings" 3775 3785 3786; in some examples soldiers or mercenaries make money by making their firefights live and more interesting 3775 3785 3786 (such as with better views and clear in-person voice explanations of live firefights); in some examples sponsors receive customer registrations from free admission to entertainment shows 3775 3785 3786; in some examples cities, stadiums or venues make money from tickets to their events or from sponsors of their events, such as a beer company who sponsors Key West's nightly Malory Square Sunset party.

In some examples real events may increasingly become unreal events 3774 (such as in some examples simulated events that attempt to resemble real occurrences; in some examples staged events that pretend to be real but are not; in some examples staged events that make no pretense about any connection to reality such as an event that is set in the "world" of a new science fiction movie like Star Wars or Star Trek, uses characters from that movie, and extends the plot with a "real" event from a scene in that movie; etc.) that are based on attracting audiences and converting the event to a restricted event that earns money from tickets 3785, sponsorships 3786, registrations 3786, marketing tie-ins 3786, etc. In some examples revenues are also earned from advertising displayed by substituting parts of the background(s) of events as described elsewhere. In some examples a new movie that is launched on a Friday may stage one or a plurality of events 3774 based on that movie and using its characters during its first launch weekend, with advertising for the movie inserted into the background of the event(s), and its restricted entrants 3775 based on the audience providing its contact information 3786 so the movie studio can send them movie marketing, discount coupons, announcements of new releases when marketing each new stage of the movie's product lifecycle, etc. Similarly, any product, charity, governance, etc. may stage events that attract audiences and presences 3774 as part of their marketing or fundraising, such as in some examples weight loss products that hold weight loss sessions at which weight loss programs are sold; in some examples car manufacturers hold NASCAR race events where they promote specific "hot" automobile models directly to those who attend; in some examples deep woods hunts are held at which hunting rifles are sold; in some examples direct conflicts to stop illegal whaling ships during whaling season are opened so those running the anti-whaling campaign can sell "crew memberships" to the audiences in which the audience "crew members" send an automatic monthly donation to support the anti-whaling campaigns—and receive both alerts and entry codes to attend future whaling ship confrontations; etc. In some examples divergent sub-events are staged that are small but highly noticeable and designed to attract attention at much larger events; in some examples these sub-events are spun off as connected sub-events such as an "anti-aging breakthrough" event simultaneously having sub-events for anti-aging creams and cosmetics, prescription drugs such as erectile dysfunction pills, etc. In some examples sub-events are inserted as closely as possible into completely disconnected events where the larger event provides nothing more than a very large audience that the sub-event may attract such as music concerts with parties (some at the concert and some in famous bars around the world) as sub-events. In some examples these cycles of staged, simulated, and unreal events may attract larger audiences of observers and participants then the real events that are attended virtually at that time, leading to the possibility that constructed digital realities may, over time, become the dominant financial revenue producer compared to physical reality.

In some examples a device connection is focused on an event 3769, and in some examples a user (optionally) joins an "event SPLS" 3769. In these and other examples where a new focused connection is the result 3769, the focused event connection is implemented by means of a device in use such as illustrated in some examples by 3749 3744 3745 in FIG. 86, in some examples it is implemented by a TP Device 3744; in some examples it is implemented by a Subsidiary Device 3745; in some examples it is implemented by a Subsidiary Device 3745 that is in use as a main and direct device.

Regardless of the type of PlanetCentral client element (such as a map 3761, dashboard 3762, search 3763, top list 3764, API 3765, or any other element 3766 or component 3766), specific events 3789 3788 may be saved as a resource 3790 in some examples so events may be retrieved from multiple devices 3790; in some examples so events may be retrieved by a plurality of users 3790; in some examples so these saved locations or events may be aggregated 3790, in some examples so these saved locations or events may be counted 3790, in some examples so these saved locations or events may be listed in order such as frequency 3790, in some examples so these saved locations or events may be listed by user importance 3790, in some examples so these saved locations or events may be listed by user ratings 3790, in some examples so these may be added to an ARM boundary as a priority or as an exclusion 3790, etc. In some examples these saved event listings 3790 may be communicated to other users by any known means such as alerts, notifications, lists, texts, emails, services, portals, widgets, API retrieval, RSS, rankings, ratings, news, blogs, broadcast networks, media, distributable ARM boundary settings, etc.

In some examples an event may be public and those who are attending it publicly may be visible by joining its event SPLS, and in some examples those who are attending the event may be visible without needing to join that event's SPLS. In some examples publicly visible attendees may be identified by means such as a directory(ies) 3778; in some examples they may be identified by other user data sources 3779; in some examples they may be identified by face recognition that employs a directory(ies) 3778 and/or other data sources 3779, etc. In some examples search may be employed to locate a publicly visible attendee(s) at an event by means such as searching a directory(ies) 3778; in some examples searching other user data sources 3779; in some examples by face recognition that employs other data sources 3779, in some examples by an augmented display of information that employs a directory(ies) 3778 and/or other user data sources 3779, etc. In some examples by selecting or finding an individual publicly visible identity(ies) at an event an observer may be able to see that identity's profile or other public characteristics by means such as a directory(ies) 3778 or other user data sources 3779.

VISIBLE HIDDEN LAYERS—SOME FILTERED VIEWS AT PLACES, EVENTS, GROUPS, ETC.: Today, many people go through their day carrying mobile phones that broadcast their identity and location to the nearest cell tower; they carry drivers licenses and other IDs (like some credit cards) with RFID chips that can be read for their identity and other information whenever they pass near an appropriate reader. As soon as an identity is known, a plurality of data sources are immediately available to any appropriately programmed networked system or device to learn more about each identified person. Each individual can be checked, reviewed, assessed, classified, and targeted for numerous purposes with much of this decision-making done at computer speed for large numbers of people at once. The data is there, as are growing numbers of systems to access it and use it. Today's world has numerous sources of public, private, commercial and government information and data that are already connected to each person, such as their personal residence information, demographic data, family members' names (and their data), credit score, credit card and debit card purchase histories (like in monthly credit card statements), each phone call made or received (like in monthly mobile phone bills), texts sent (in phone company records), locations visited (such as based on tracking by mobile phones and mobile applications), school transcripts, online resumes, online gossip, photographs posted (when tagged), and much more. Growing volumes and types of data exist, and are available to people and systems that can access it.

Imagine yourself in a digital place where everyone is identifiable such as any SPLS focused connection between two or a plurality of SPLS members; or at a digital event that charges admission such as a ticketed music concert; or a company's employees who attend their CEO's "all hands" speech by logging into the company network; or the teacher, students and parent chaperones on a class digital field trip to the Smithsonian Museum in Washington—there are numerous reasons to be in a digital place and be identifiable at the same time. In some examples it is possible to connect each digitally identifiable person with their accessible information in real time—at a digital place they have presence. Imagine being in a digital place and instead of seeing "all" or "everyone," apply a filter to show only one group at a time who is there: first, show only registered Republicans, then only registered Democrats, then only Independent voters, then citizens who are not registered to vote, then those who are not citizens—with the people in each group selected being visible when their group is visible, and invisible when their group is not selected. In some examples a teacher could take a class on a digital visit to the New York Museum of Natural History and the class would not see anyone there except each other. In some examples you could attend a giant digital rock concert in Madison Square Garden and be with (select to see) only the people from your hometown, so you can meet more of your neighbors who like the same rock band as you. In some examples you could drop in on a digital political rally on the future of gay marriage on the steps of the Supreme Court building while the justices are hearing a landmark case, and (choose to) see only the GBLT people there. In each case accessible personal data can be used to create a boundary(ies) that determine who is and who is not displayed in each place in your digital reality. In some examples all of a person's digital realities boundaries could be set to include only the types of people he or she wants in the world, and exclude everyone else—taking the occasional desire to live in a world "just like me" and making that world appear.

In each digital place, each identifiable person can also have his or her accessible information displayed by and for someone else—with or without granting permission, and with or without knowing their information has been accessed and displayed. In some examples a person may be in an SPLS focused connection and someone else may view their personal directory listing, their marital status, their family members so they can ask how their kids are doing, or the latest online gossip about them. In some examples a group of shoppers may be in a retail store and their previous credit card purchases may be examined to see if they buy this store's type of goods, along with their net worth (if the retail chain's computers can access shoppers' financial data) to classify and target them for various size purchases—to quietly advise the store's employees on a possible selling goal(s) for each customer. In some examples an identifiable person's data may be manually checked by someone else, and in some examples an identifiable person may have their data automatically retrieved and processed to auto-classify them for certain commercial actions or safety/protection actions (as described elsewhere).

Turning now to FIG. 88, "Filtered Places, Events, People, Etc.," some examples are illustrated for using existing data in digital places where one or a plurality of those present is identifiable. In some examples an identifiable presence occurs in some examples through an SPLS 3801, in some examples through a Local Teleportal (LTP) 3801; in some examples through a Mobile Teleportal (MTP) 3801; in some examples through a Remote Teleportal (RTP) 3802 in any location where one or a plurality of people can be identified; in some examples at a TPDP event 3803 (as described elsewhere); in some examples in a constructed digital reality 3804 where one or a plurality of people can be identified; in some examples from any other digital source 3805 we are one or a plurality of people can be identified; and in some examples from any presence facility 3805 (as described elsewhere).

In some examples any identity who is present (herein referred to as the user) may select one or a plurality of display filters to apply 3808; and in some examples "the user" may be a computerized system, method or process that has established presence for the purpose of identifying, tracking and providing filtered data for one or a plurality of types of users (and is herein referred to as "the user"). In some examples the user may select one or a plurality of identified people to view 3810; such as in some examples selecting everyone there 3810; in some examples selecting just one identified person 3810; and in some examples selecting a subset of the identified people there 3810 (such as in some examples by a personal characteristic such as in some examples everyone present who is in Mr. Taggart's architecture class, in some examples everyone present who lives in Manhattan, in some examples everyone present who is an IBM employee, and in some examples selecting based upon any other definable "group" characteristics data that is accessible to the user). In some examples said display selection 3810 does not have sufficient data and cannot be made, so the current view 3811 or the default view 3811 is displayed. In some examples said display selection 3810 has sufficient data so that the selected view is displayed 3812 (such as in some examples everyone present 3812, in some examples just one person 3812, and in some examples a selected subset of the people there 3812).

In some examples based upon a setting or use of an element in the user interface, the selected identity(ies) 3810 are all that are visible in the displayed view 3812; and in some examples the selected identity(ies) 3810 remain visible with the other identities in the view but each selected identity is highlighted 3812 (such as in some examples with a glow 3812, in some examples with a colored border 3812, and in some examples by other means 3812) such that in some examples a selected identity(ies) is the primary focus yet may or may not be displayed with the non-selected identities who have presence. In some examples based upon a setting or use of an element in the user interface, the resulting display of a selected identity (ies) 3812 is visible only to the user who made the selection; and in some examples the resulting display of a selected identity(ies) 3812 is visible to all the identities present.

In some examples a user who is present may filter the displayed and identified individuals 3811 3812 in an additional way(s) 3814 by choosing one or a plurality of additional filters. In some examples a user may retrieve 3816 and displayed 3816 a list of additional filters 3814 for selection, where said list displays only filters that may be used to access the limited set of data accessible on the currently displayed and identified individuals; or, alternatively, the list of additional filters displayed 3814 3816 may include a complete listing of possible filters and characteristics but gray-out or use some other indicator to show which filters are not accessible. In some examples said filters may access and retrieve data on each displayed and identified individual 3011 3812 such as in some examples that identity's name 3816; in some examples that identity's directory data 3816; in some examples that identity's residence address, city and country 3816; in some examples that identity's business address, city and country 3816; in some examples that identity's primary language(s) 3816; in some examples that identity's race 3816; in some examples that identity's religion 3816; in some examples that identity's marital status 3816; in some examples that identity's family members 3816 (such as in some examples their names, ages, gender and other characteristics); in some examples that identity's employer 3816; in some examples that identity's career and employment history 3816; in some examples that identity's current business data such as their company's financial condition 3816; in some examples that identity's memberships in professional groups or associations 3816; in some examples that identity's social memberships 3816; in some examples that identity's political party registration 3816; in some examples that identity's country of citizenship 3816; in some examples that identity's governance(s) membership(s) 3816; in some examples that identity's credit score 3816; in some examples that identity's financial net worth 3816 (such as its amount and whether it is positive [assets] or negative [debts]); in some examples that identity's recent credit card purchases 3816; in some examples that identity's recent debit card purchases 3816; in some examples that identity's other recent electronic payments 3816; in some examples that identity's medical status and/or medical conditions 3816; in some examples that identity's current prescribed medicines 3816; in some examples that identity's telephone calls made and received 3816 (from telephone and/or communications company records); in some examples that identity's recent text messages 3816 (from telephone and/or communications company records); in some examples the recent online gossip retrievable about that identity 3816; and in some examples other data that may be accessible and retrievable about that the displayed and identified individuals 3811 3812. In addition, in some examples said filters 3816 may include previously saved filtered views 3828 (as described elsewhere).

In some examples the selection of one or a plurality of filters 3814 3816 initiates rights validation 3817 to confirm that the requesting user has the right to retrieve the specific data requested (such as in some examples requiring verification of the user's logged in identity's rights, in some examples requiring a separate authentication, authorization, password, etc.); and in some examples the user does not have sufficient rights so the filtered data cannot be retrieved, and in that case the current view 3815 is displayed without additional data (though in some examples with an error message, and in some examples with instructions on how to obtain rights such as in some examples by purchasing the data from a commercial database). In some examples a user's rights 3817 may be based on rules 3818 rather than permission 3817; and in some examples said rules may include whether or not the user is the "owner" of the identity(ies) 3818 (such as in some examples if a person wants to see which of their data is publicly available and which is not); in some examples whether or not the user is a member of a group that has the right to access the requested data 3818; in some examples whether or not the viewed and filtered identity(ies) have granted permission to access the requested data 3818 (such as in some examples mobile phone customers contractually authorizing their communications vendor's employees to access detailed communications records); in some examples whether or not the user has a commercial right to access the requested data 3818 (such as in some examples a bank's employees accessing their customers' financial records and financial related data); in some examples whether or not the requested data is publicly accessible and visible 3818 (such as in some examples data that is available for free, and in some examples data that is available for purchase); in some examples whether the user has a government-granted right to access the requested data 3818 (such as in some examples homeland security officers, and in some examples contractors of private security companies who provide homeland security services); in some examples whether the user has a governance-granted right to access the requested data 3818 (such as in some examples a governance's members contractually authorizing its accounting employees to access their purchase history[ies] to confirm that the governance is automatically receiving its required fees); in some examples any other rules and/or access rights that apply 3818. In some examples the user has the right(s) to retrieve the requested data 3814 3810 3817 3818 and in this case the selected identity(ies) are retrieved 3819, (as needed) those identities' profiles are retrieved 3819, and the specific requested 3814 3816 and authorized 3817 3818 filters' data is retrieved 3819.

In some examples based upon a setting or use of an element in the user interface, the retrieved data 3819 is visible in the displayed view 3822 3823 only to the user who requested the data; and in some examples the retrieved data 3819 is visible and in the displayed view 3822 3823 to all the identities present. In some examples each identity's retrieved data is displayed next to that identity's image 3824; in some examples each identity with retrieved data is highlighted 3825 (such as in some examples with a glow 3825, in some examples with a colored border 3825, and in some examples by other means 3825) such that in some examples an identity may be clicked to display its individual data 3825, in some examples pointing at an identity may display its retrieved data 3825, in some examples activating an icon may display all identities' retrieved data 3825, in some examples pointing at a symbol may display all identities' retrieved data 3825, and in some examples other means may be used to display and/or hide one or a plurality of identities' retrieved data 3825.

In some examples a combination of a selected group 3810 3812 and one or a plurality of selected filters 3814 3816 produces a useful access to data 3823 3824 3825, which may then be saved for rapid re-use 3826 3828. In some examples a desired filter 3826 can be saved to an icon 3828, symbol 3828, widget 3828, or other interface device 3828 for pointing, highlighting, clicking, voice command, floating interface element or another means for requesting said saved filter and displaying its data directly. In some examples a desired filter 3826 can be saved to a list of filters 3828 3816, a menu 3828, a subsection in the larger list of filters 3828, or another means for re-using said saved filter without needing to re-create it. In some examples saved filters may be distributed 3829 so that others may retrieve and apply those filters—to make it quick and easy to distribute certain parallel and useful views of the people in a society.

While there are some privacy issues, a networked digital society is an individually and collectively monitored society. Some systems can make that collected data clear and visible so that those who are monitored may become aware of how they are tracked and what is known and available about them, which enables them to continue or alter their behavior as they decide is appropriate. For one illustration, in some examples this filter may be applied by using publicly available data records, such as in some examples an RTP location may be the U.S. Senate and the individuals present may be filtered to show only currently present Senators. In some examples a "public official filter" may be applied to the visible Senators to show their individual financial data from their publicly filed tax records. If the Senators are assembled for a vote such as on energy policy, in some examples a filter applied to the Senators can display the amounts of contributions each has filed as receiving from energy company executives, energy industry PACs, energy companies, and energy industry lobbyists—whether that data comes from each Senator's public records or from an independent research organization who collects and publishes those totals. As each Senator votes on a bill, their filtered view may show their individual financial relationship to the industry affected by that bill. Therefore, in some examples it may be possible to determine the nature of representation provided by a government body such as in some examples whether it is representative of the people who elected it, and in some examples whether it is representative of an industry that funds it. The data displayed is only how that government body operates, for each Senator is required to be honest and "play by the rules," so no Senator is assumed to be doing anything improper.

For another illustration in some examples "public official filters" may be widely applied to any elected official who publicly report both their taxes and the contributions they receive. In some examples a "public official" filter may be created, saved and openly distributed by a plurality of known means so key personal financial data and key funding data is displayed routinely with an elected official's digital presence. In some examples a Congressman's public town hall meeting could be digitally broadcast by any member of the audience using a Mobile Teleportal or an AID/AOD running a VTP, and in some examples a "public official filter" could be run to show that Congressman's data; and in some examples the source member of the audience may update the filter for different industries as the audience's questions turn to education, schools, gas prices (energy), communications, transportation, defense, or anything else. Therefore, the elected representative's financial relationship to each industry in each question could be updated in real-time and viewed while listening to the congressman's answer to each question, as a normal part of that Congressman's digital presence. In some examples with this type of data retrieval and display of publicly available data, digital presence may provide a clearer view of how our society operates than physical presence.

For another illustration in some examples the above system, method or process may be used to create a "constructed digital reality" that is broadcast 24×7×365 for one or a plurality of recipients to view. In some examples one or a plurality of sources may broadcast one or a plurality of appearances by Congressmen and Senators (such as by LTP's, MTP's, RTP's, AID's/AOD's running a VTP and other means), and a receiving organization (including in some examples a government body such as the Senate, in some examples an individual, in some examples a political party, in some examples a PAC, in some examples a think tank, in some examples a public interest research group, and in some examples in other type of recipient) receives those broadcasts as sources for creating and re-broadcasting a constructed digital reality that combines those appearances with the display of filtered data next to each Congressman and Senator. In such an illustration the recipient receives one or a plurality of said appearance broadcasts and utilizes automated means to select (in some examples by automatically identifying, tracking and highlighting the Congressman(men) and or Senator(s) in the display of each appearance); and in some examples to process each selected identity by applying a dynamic filter such as a "public official filter" described above. In a further illustration, the words of the selected identity may be processed by voice recognition (as described elsewhere) to identify industry names or terms and determine the industry (if any) in the speaker's comments. Each industry category may then be used run the "public official filter" and display that industry's funding or other data next to the highlighted speaker in real-time, while the public official is speaking about it. In some examples such a constructed digital reality may simply be broadcast in real time for interested recipients. In some examples such a constructed digital reality may be recorded for on demand viewing, in whole by appearance or in segments by each industry, at any later date or time. In some examples such a constructed digital reality may be recorded, analyzed by representative and industry, and provided for on-demand viewing such as by industry so that competing lobbyists and companies may determine the range of each company's influence on the public time and activities of Congressmen and Senators. In some examples the analyzed data by industry of Congressmen's and Senators' time and activities may be used to determine the percentage of each elected representative's public time (or another metric such as the number of activities) spent on behalf of their constituents as opposed to how much they focus on those who fund them. Therefore, in some examples, the use of filters along with other ARTPM capabilities may provide a rich and revealing way to view the world along side traditional physical reality.

TELEPORTAL SHARED SPACES NETWORK (TP SNN), ALTERNATE REALITIES MACHINE (ARM), SHARED PLANETARY LIFE SPACES (SPLS), ARM DIRECTORY(IES):

INTRODUCTION AND SUMMARY: The TPM's Shared Spaces Network includes an Alternate Realities Machine (herein ARM) component that relates generally to providing means for individuals, groups and the public to fundamentally redefine one common physical reality as multiple digital reality(ies) so they are a better reflection of our needs and desires. In some examples its transformations include Shared Planetary Life Spaces (SPLS) and ARM Directory(ies) that reverse the current physical presence-first priority so that we may be more closely connected to the people and parts of the world that are most interesting or valuable to us, rather than the place where we are physically present. In some examples it provides new types of protection and security at the levels of personal, group and public SPLS (Shared Planetary Life Spaces)—including recognizing, evaluating and providing means to include or exclude people, groups, automated tools, etc. that would like to enter an SPLS either digitally and/or physically. In some examples it reverses control over media from an external media-driven culture to a personal and/or group filtered culture that prioritizes what we want and excludes what we don't want (and may optionally include paywalls so we may earn income for providing our attention to advertisers, brands and others noisily pursuing commercial goals, and others who want to buy part of our "mind share"). In combination, in some examples the result is to divide our common and ordinary reality into the unique separate and desired realities each of our identities wants; with increased individual, household and group protections; and with substantially fewer yet more desired messages from the ordinary public culture.

This TP Alternate Reality diverges from our current reality which is physical, and where presence is in the current reality, which is what reality has been throughout human evolution and history. In this current reality we wake up in the morning where we live (e.g., our home or household) that is based on private property (e.g. a secure place to live with locked doors, entrances for greeting strangers like doors, etc.). At home we can walk through our houses, look in anywhere and interact immediately with everyone there. When we go to work we can walk down the hall and look into any cubicle or office, and immediately talk directly to the person(s) there. When we go to a public place like a sidewalk, park, mall, library, museum, etc., we can encounter numerous people and interact immediately with any of them. Therefore, our current reality is one of physical interactions where the focus is on proxemics (the distance or space between people as they interact), interaction rituals (such as identity, roles, maintaining face, emotions, affirmations, power, leadership, etc.), presence (which is local, physical and defined by both explicit boundaries and implicit assumptions that keep us present yet separate), access rights (by means of property ownership and authorizations such as the right to visit places, or use tools and resources), and much more.

Figure 89:
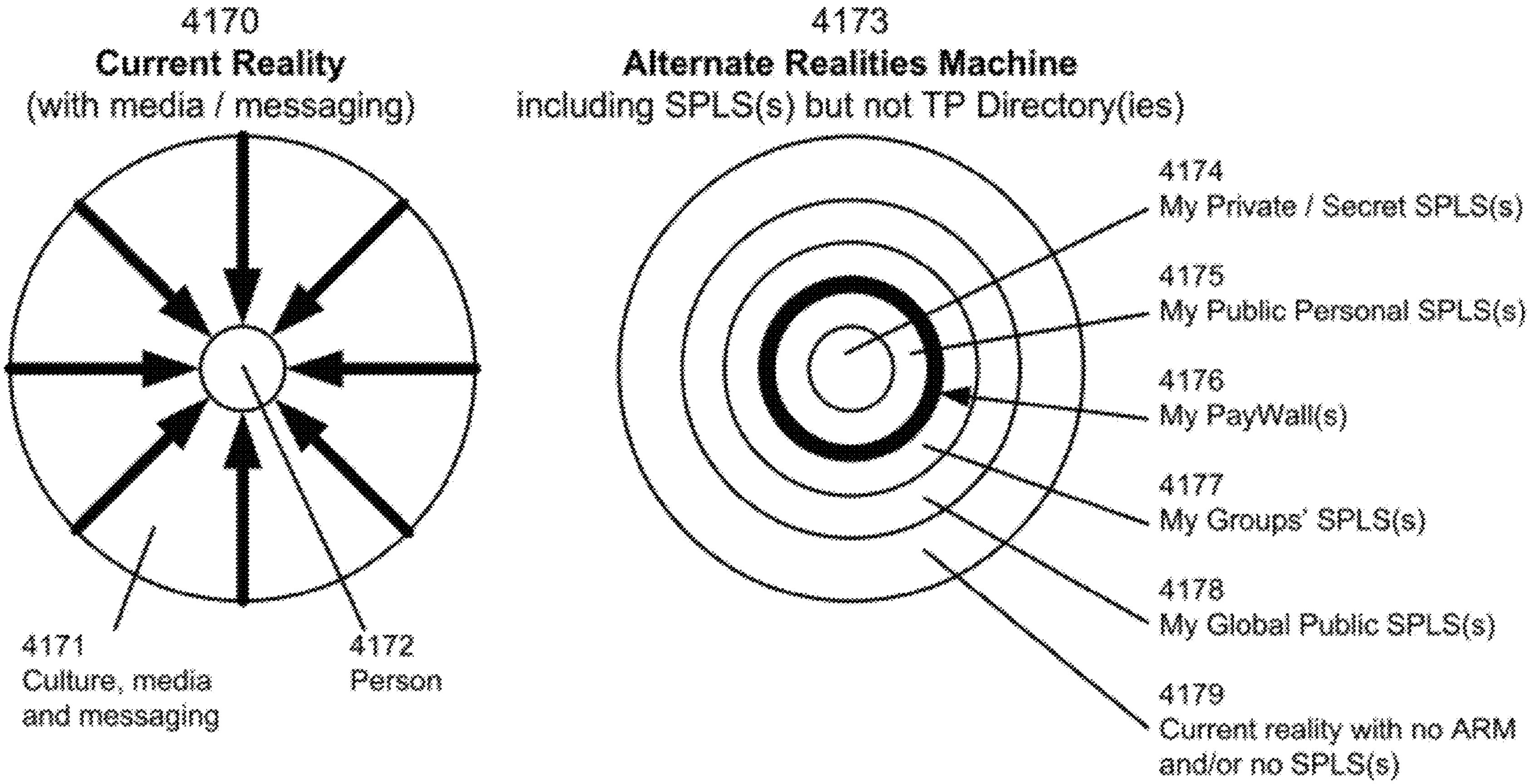
FIG. 89 is a pictorial diagram showing current reality (prior art) compared to some examples of the Alternate Realities Machine (ARM), illustrating some ARM control levels.

As our current mass communications culture and Digital Era emerged 26 in FIG. 1 one of its trends is illustrated in FIG. 89. Our current reality 4170 includes large and growing volumes of public culture, commerce, media and messaging 4171 that floods each person 4172 and competes for each person's attention, brand awareness, desires, emotional attachments, beliefs, actions, etc. Another trend started in the 1980's when many people who did their jobs through a computer screen started earning more then people who made things manually and physically in their work. For example, by 1995 standing on a New York street corner in the upper East side, surrounded by skyscrapers, one could look around and see tens of thousands of people who went to work far above—such as on the 70th floor of a corporate headquarters, in a media company, in an advertising agency, etc. If asked, "What do those people make?" the answer is those people don't actually make anything. Most did their jobs by working through computer screens and earned many times the income of workers who made real products with their hands or did other manual work. Since the 1970's there has been a growing income gap between high school graduates who do physical jobs, and those with college and graduate degrees who work digitally.

In the current reality, however, physical presence remains more important and digital communications remain secondary. The TPM's Alternate Realities Machine (ARM) proposes reversing this with means to make some digital environments primary and physical presence secondary. In some examples those who use Shared Planetary Life Spaces (SPLS), the AKM, components of the TPM, etc. may know more about what they need to do to have successful lives and incomes in the emerging digital environment—they may become better at learning, growing, interacting, earning, enjoying more varied entertainments, being more satisfied, becoming more successful, etc. Unlike them, those who live only in the ordinary public reality, and do not live in an ARM, SPLS, AKM, etc. might fall behind them, so that those who live in their own reality(ies) by means of SPLS(s) may become the people and lives to emulate. This parallels what happened to those who work in a manual and physical job—the pre-eminence of digital-related employment means manual jobs are no longer the preferred goal. Another example of the current reality is the epidemic of obesity that may be related to the combination of a food manufacturing industry and delivery industry that both earn more when people eat more, a media industry that earns more when the food industry advertises more, a real estate industry that earns more when the food and restaurant industries build out more, a transportation industry that earns more when the food industry delivers more worldwide, combining with other businesses and services to a form a food delivery system that earns more when their "mind share" of the public, literally, grows both industry size and the required consumption that is reflected both in wider waistlines and a public health crisis.

Therefore, it is an object of the Alternate Realities Machine to introduce a new paradigm for human reality whereby each person and group may control their reality(ies) by utilizing one or a plurality of means provided by the ARM—means that multiply human realities and make them controllable and malleable. Unlike the current reality, where the ordinary culture and its imposed advertising, messages, and media attempts to dominate a large and growing part of everyone's attention, desires and "mind share" (as visually demonstrated by expanding waistlines and obesity worldwide) the ARM provides flexible means for people and groups to filter, exclude and protect themselves from unwanted messages and people that would like to enter their spaces (both digitally and physically). Additionally, the ARM provides means (TP Paywalls) so that individuals and groups may choose to earn money by permitting entry by chosen messages and/or people which are willing to pay for attention and "mind share." In brief, just as people typically use a television remote to skip ads and watch only the shows and news they want, the ARM provides means for controlling one or a plurality of SPLS's so each's separate reality skips what we don't want and includes what we like (with both boundaries and priorities based on what we choose), so we no longer need to blindly accept everything the ordinary current reality attempts to impose on us.

A high-level visualization of the ARM is provided in FIG. 89 with an illustration of the ARM 4173 based on Shared Planetary Life Spaces (SPLS). In it the current public reality is still available 4179 with no ARM, SPLS(s), etc. Within that however, the ARM provides multiple levels of control and multiple types of SPLSs. Starting from the most public (outside/external) 4178 and moving to the most private (personal and non-public) 4174, each person may have one or a plurality of SPLS(s) at each of these levels:

A first level is My Global Public SPLS(s) 4178 which provides for multiple SPLS(s) that may include various appropriate general filters and protection, but for the most part do not include them and are generally various manifestations of the ordinary public culture. In some examples is a state's or city's citizens, and sub-groups or other groups may include those who receive each type of government services that may be provided to them.

A second-level is My Groups SPLS(s) 4177 which includes the groups to which that person is a member, each of those groups' SPLS(s), and filters and/or paywalls they have applied to their SPLS(s). In some examples is the corporation where one has a job (where means for TP Protection are likely to be used extensively), and in some examples is a governance (s) which an identity may join (where means for TP Filters are likely to be used extensively if the governance is based on a set of values, a preferred activity such as a sport or hobby, etc.).

The next levels are Personal and these include one's public, private and secret SPLS(s) 4175 4174—and these may be inside one or more chosen paywalls 4176. Here, both TP Protection and/or and or TP Protection may be used with whatever frequency and intensity each person would like, with the option of adding TP Paywalls that may produce additional income and add more filtering out of unwanted messages.

One dimension is the scale at which the ARM permits the creation of manageable human realities. Since each person may have one or a plurality of identities, and each identity may have one or a plurality of SPLS's, the ARM's multiple levels of reality are for each identity—not just for each person. Because the ARM services each identity and one person may have a plurality of identities, and because each identity may have a plurality of SPLS's and the ARM services each SPLS, this multiplies the numbers and types of SPLS(s) available far beyond any simple division of the one current reality. In addition, settings may be saved, distributed and shared widely. Since SPLS metrics may be tracked and reported, the most effective, satisfying, etc. SPLS's may be reported publicly and their settings accessed and installed rapidly. This combination enables rapid learning, setup and use of the most effective or popular SPLS settings (including their boundaries such as Paywalls, Priorities, Filters, Protections, etc.). Clearly, control over a singular current human reality(ies) may be shifted to individual choices of multiple new and evolving trajectories. The pace of this would be affected by these new realities' capabilities for delivering what people would like, as it would be affected by the excessive level and poor quality of messaging from the ordinary public culture, as it would be affected by people's desires to create and live in their desired alternate realities—so this is likely to match what the people in each historical moment want and need, as well as evolving over time to reflect their growing or diminishing desires.

Ultimately, in some examples control over what and how we perceive and interact with reality may be managed by each person and identity, because the ARM's components, systems, services, etc. illustrate means for replacing the current culture's external control over what we see as reality. Instead, the ARM provides means for expanding our control over where and how and why we choose to "be present" (anywhere in the world including our digital presences), as well as what we choose to include in or exclude from our "presence."

In short, by means of an ARM each of us is able to choose one or a plurality of reality(ies) that we want—rather than being compelled to live in one common reality with the countless competing messages, desires, belief systems and branded "mind share" that it attempts to impose on us.

It is therefore an object of the Alternate Realities Machine's (ARM's) Shared Planetary Life Spaces (SPLS) and ARM Directory(ies) to introduce a new paradigm for human realities that at a high level includes: Each person may have a plurality of identities (as described elsewhere) wherein each identity may have one or a plurality of Shared Planetary Life Spaces (SPLS). Each SPLS is essentially always on and may be interactively set for two-way use or observation only. Each SPLS can be essentially everywhere there is a connected TP device (including VTP's and RCTP's on a plurality of subsidiary devices). Each SPLS supports new universal assumptions about life: I and everyone else can be everywhere that is connected at all times. If I have a plurality of identities, then each of my identities can also have a plurality of SPLS(s), and each of my identities may be anywhere that is connected at any time that I choose. Each SPLS may include Shared Lives (other persons or identities), Shared Places (RTP or other TP devices), Shared Tools and Resources (RCTP's such as PCs, TV set-top boxes, applications, data, services, the Web, etc.). Within any of my SPLS(s) I can simultaneously have multiple alternative presences with others using Shared Lives connections, be in multiple Shared Places, and use multiple Shared Tools and Resources. Groups have multiple SPLS(s), and each of those includes Shared Lives, Shared Places and Shared Tools and Resources. Public SPLS(s) provide the public with new types of observations, recognition of identities, presence, etc. Each SPLS enables sharing by multiple identities, places, tools and resources. Each SPLS may include physical monitoring of people (such as for secure access and protection), even where only one TP device is available. Each SPLS may include additional digital functions such as recording, editing, archiving, re-transmitting, broadcasting, etc. One component of this is a sharing facility (herein ARM Directory(ies)), which may include one or a plurality of sharing facilities such as directories. Said ARM Directory(ies) accumulate, store and maintain the data necessary to enable sharing, determine current presence, etc. When a Shared Life (other persons or identities) is requested, an ARM Directory(Ies) is used to determine that identity's presence, preferred device(s) and availability (their current Device in Use or DIU)—together a Delivery Profile. If not available, it defaults to a TP Messaging System. When a Shared Place (RTP or other TP devices) is requested, an ARM Directory(ies) is used to determine that TP device's current state, media, address, etc. and connects to that TP Place at that time. If not available, it defaults to a TP Reconnection System. When a public Shared Tool or Resource (by means of TP Remote Control or RCTP) is requested, an ARM Directory (ies) is used to determine one or a plurality of available Tool(s) or Resource(s) in that category, along with its availability, device types, address, etc. and connects to the selected Tool or Resource. If not available, it defaults to a TP Reservation System. When a private Shared Tool or Resource (by means of TP Remote Control or RCTP) is requested, an ARM Directory(ies) is used to determine the availability of one or a plurality of said Tool or Resource that belongs to an identity in one of that user's currently open SPLS(s) along with its availability, device type(s), address, etc. and connects to the selected Tool or resource. If not available, at the user's option it defaults to either a TP Reservation System or a Shared Life contact with that identity to request the Tool or Resource. Each Shared Instance Connection may take various forms, and each individual connection may be preserved and reused (such as by a recording, storing, editing, forwarding, broadcasting, etc.). When a requested SPLS connection is not available backup means are provided such as TP Messaging (with identities), TP Reconnection (with places), and TP Reservation (with public or private tools or resources). As new connections are found (such as by searching, browsing, and/or finding by other means) they may be automatically and/or manually added to a SPLS. ARM Directory(ies) (the sharing facility) may utilize automated and/or manual entry of persons, identities, devices, places, tools, resources, etc.—including establishing profile(s) (in some examples an identity's User Profile, and in some examples that identity's Delivery Profile for the user's preferred device order for receiving SPLS, TPM and AKM communications). These ARM Directory(ies) entries may be for persons, identities, groups, the public, etc., may be made from any shared instance connection, and may include identities, devices in use, places, tools, resources, services, etc. TP Protection may be provided for identities, groups, the public, governances, etc. by means such as SPLS inclusion and recognition of identities (in some examples facial recognition, biometric identifiers, logins, IDs for places/tools/resources, etc.), wherein recognition may be used to permit entry, block it, interact to acquire information, establish relationships, etc. TP Filters may be provided for the SPLS(s) of identities, groups, governances, the public, etc. by means such as advertising recognition, specific sources (such as a media company, a broadcast network, a television channel, a content source, a vendor, etc.), specific types of recognizable content (in some examples subjects, topics, ratings, categories, etc.), wherein said filters may be used to permit entry, block it, interact to acquire information, establish relationships, etc. In some examples is excluding "entertainment" whose values may damage children's morals, and in some examples is to filter news such as including the categories of politics, football, entertainment, health, environment and photography—while excluding the news categories of science, travel, business and all sports except football. TP Paywalls may be provided for the SPLS(s) of identities, groups, etc. by means such as individual pricing, group pricing, membership in a group or collective that sells and/or auctions group access together (and divides the revenues among group members), various types of collective marketplaces such as auctions, affiliates, partnerships, sales collectives, governances, etc. In some examples is excluding advertisers that do not pay the audience's members for their attention, and including advertisers that pay money to the audience for watching their messages. SPLS(s) boundaries (in some examples Protection, Filters, Paywalls, etc.) may be reused widely (in some examples by saving, storing, distributing, opening, editing, renaming, archiving, broadcasting, etc.) so that the popular "walled gardens" may be easily and widely distributed, copied, modified and reused. With each person having the option of a plurality of identities, and each identity having the option of a plurality of SPLS(s), one person may have membership in both multiple open and public Shared Planetary Life Spaces, and in various different types of SPLS(s) that are "walled gardens" with filtering, secure protections, and paywalls that earn income. A plurality of applications, third-parties, etc. may access and use the ARM Directory(ies). In some examples if a person's public identity is logged in, then its "presence" is known and a separate application may utilize that by accessing it, using it, displaying it, etc. If a private identity is logged in, then only an appropriately authorized application (that is one part of it SPLS(s)) may access it. A plurality of services may be provided (in some examples a Web profile and controls page by the ARM Directory(ies), or in some examples by a third-party vendor such as a search engine) for each SPLS (optionally including persons, identities, groups, public spaces, places, tools, resources, etc.). The services provided may be in exclusive and private relationships (with exclusivity provided in return for payments), or they may be nonexclusive, public and open, or they may be in any combination (in some examples open but with preferred vendors buying preferred positions in return for payments). Since SPLS(s) have boundary controls, vendor relationships may be sold by each SPLS in return for payments that are income to the identities that are members of the SPLS. ARM Directory(ies) may be analyzed and "data mined" for automated and/or custom reports that show where individuals are best, average or lowest, as well as the size of any gaps they need to fill, and what to do. These reports (and optionally alerts, notifications, etc.) enable various types of optimization and self-improvement systems (in some examples a "fast follower" process to catch up with the best"), as well as "leap ahead" guidance to enable jumps to the highest achievement levels (if said leaps are possible).

In a brief summary of this Alternate Realities Machine (ARM), it makes human reality a conscious choice: We choose to include what we want (in some examples including everything in all of the current reality, or prioritizing it and making sure what we like is included), and we choose to exclude what we do not want or what we dislike (in some examples excluding entertainment or sources that are not appropriate for children, or excluding a genre such as horror, etc.), and optionally we may choose to be paid to include the parts of reality that want our attention and need it for their financial prosperity (in some examples by including advertisers that pay us to see their messages, or including new political parties that gain visibility by paying audiences to see lengthier messages). Additionally, when a person has a plurality of identities, and when an identity has a plurality of SPLS's, each may have its own combination of TP Protections, TP Filters, TP Paywalls, etc.)—so that one person may choose to enjoy multiple different human realities that each have worldwide "presence." In addition, reporting the metrics from the ARM Directory(ies) may identify the SPLS(s) (that is, the "ARM reality settings") that produce the greatest successes (however each person prefers to use available metrics to define that). These SPLS's settings may be saved, copied and widely distributed (by means of copying and sharing those SPLS(s) settings)—perhaps raising income, performance and satisfaction widely by means of evolving human reality(ies) at a new pace and trajectory into what works best for various people and groups.

It will be a new paradigm for human reality when our choices allow us to specify a plurality of different types of realities, interactively shift between them by logging in as different identities, modify each of them by changing its SPLS's boundaries, learn which of them does and does not work best to achieve various types of goals, then widely distribute new and better "realities" for others to enjoy better lives and raise happier families. Instead of one external ordinary public culture controlling and shaping everyone, with an ARTPM we may gain control of our worlds and select the possibly more successful and happier realities in which we choose to live.

Summary of the figures: It is an object of the "Alternate Realities Machine" (hereinafter ARM) to introduce a new paradigm for human reality whereby people may be more connected remotely than locally, the means for said remote connections include Shared Planetary Life Spaces (SPLS) and ARM Directory(ies) that can provide "always on" connections and connected spaces; the inclusion in these spaces of Identities, Places, Tools, Resources, etc. (herein IPTR); with use by multiple devices, individuals with multiple identities, groups, the public, etc.; the ability to set boundaries on each SPLS such as Paywalls, Priorities, Filters, Protection, etc.; the ability to provide backup actions in the event a connection is not made; etc.

Figure 90:
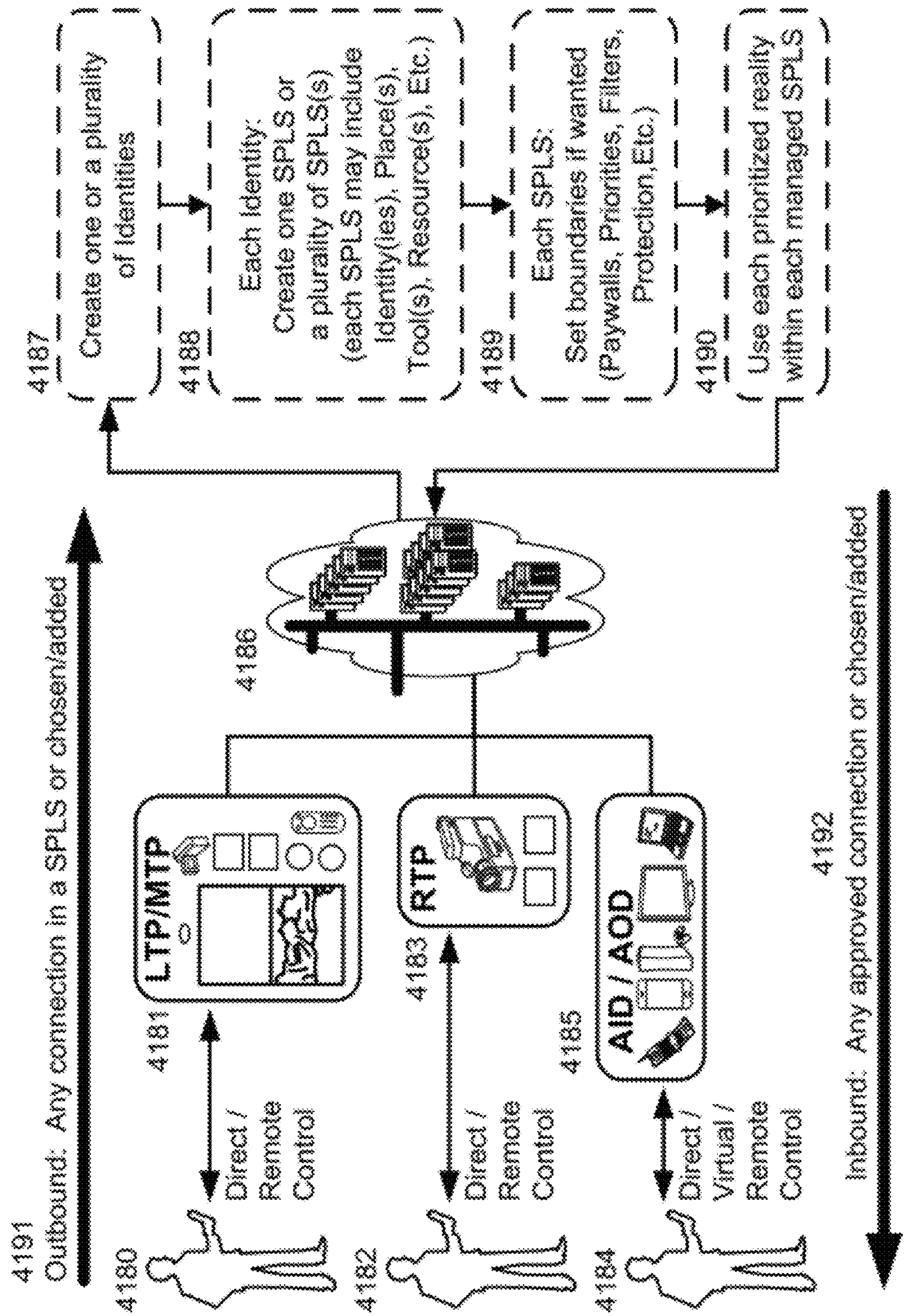
FIG. 90 is a pictorial block diagram illustrating some examples of how a person may have multiple (ARM) identities, multiple (ARM) SPLS(s) and ARM boundary management for each SPLS.

FIG. 89: It is another object of the ARM to expand current reality by providing multiple levels of filtered realities that meet varied needs of individuals, identities, groups and the public. FIG. 90: It is another object of the ARM to provide systematic processes for an identity, group or the public to use, create, set boundaries, edit, etc. one or a plurality of alternate realities.

Figure 91:
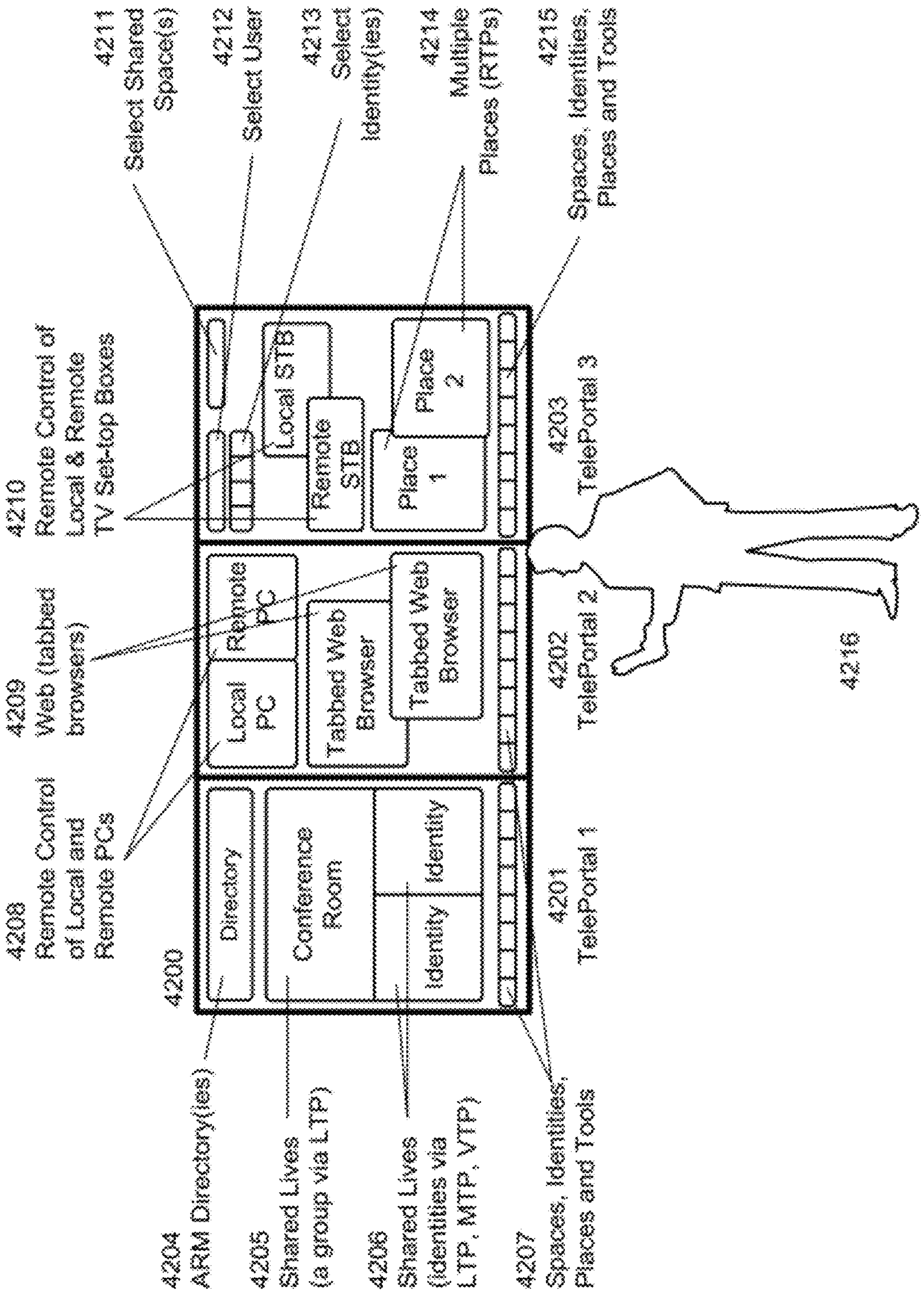
FIG. 91 is a pictorial diagram illustrating some examples of an identity with an SPLS (Shared Planetary Life Space) that includes identities, places, tools, resources, subsidiary devices, etc.

FIG. 91: It is another object of the ARM for each SPLS to include Identities, Places, Tools, Resources, etc. FIGS. 92, 93, 94, 95: It is another object of the ARM for systematic use by multiple devices in some examples Local Teleportals (LTP), Mobile Teleportals (MTP), Virtual Teleportals (VTP), Remote Teleportals (RTP), etc.

FIGS. 96, 97, 98, 99, 100: It is another object of the ARM to provide use by one or a plurality of identities, with each identity able to select and simultaneously open one or a plurality of different types of SPLS's; wherein said multiple types of SPLS's may include in some examples an Identity's public SPLS's, an Identity's private and/or secret SPLS's, a group's SPLS's, the public's SPLS's, etc.

Figure 101A:
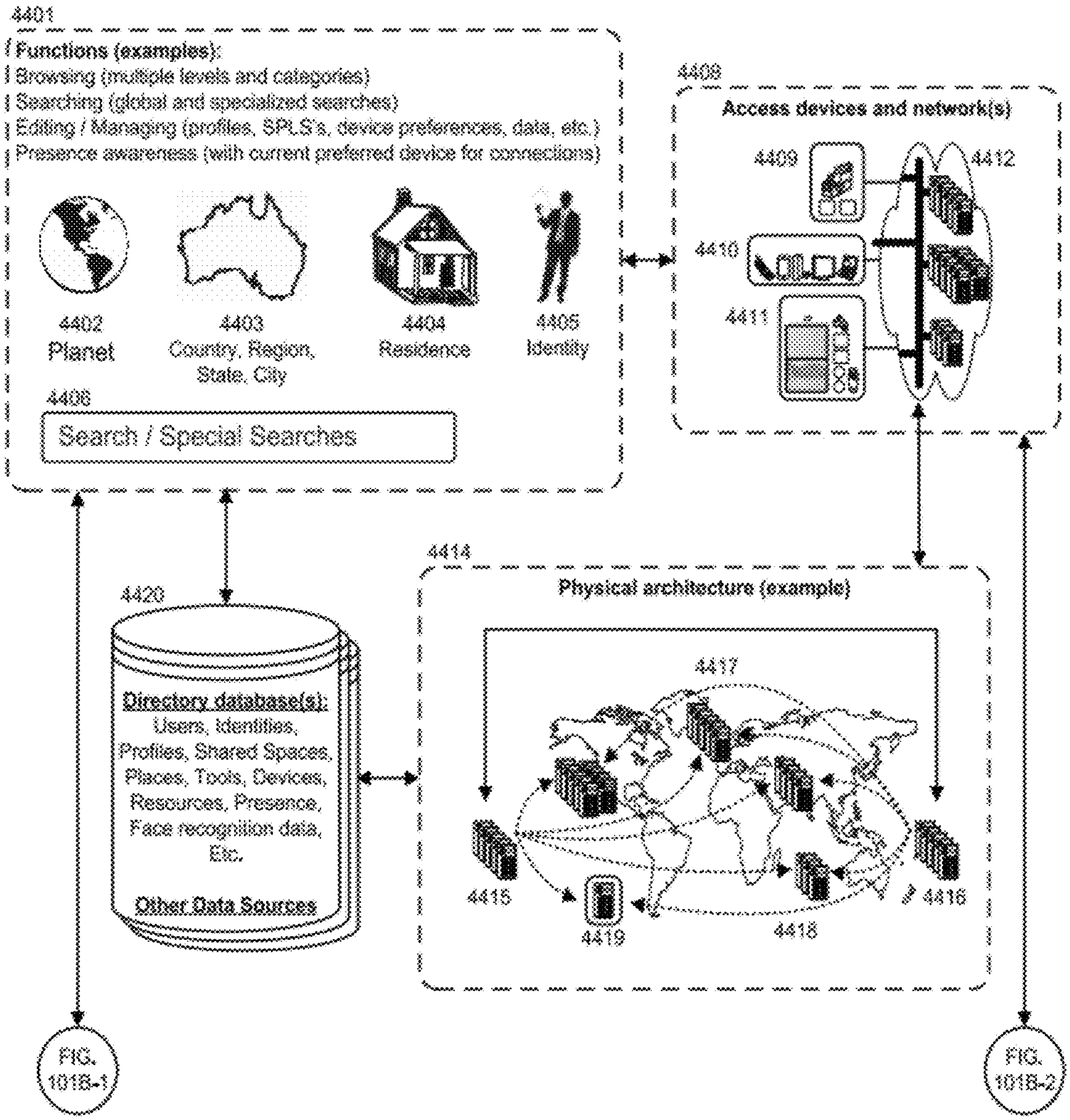
FIG. 101 is a pictorial block diagram illustrating some examples that summarize an ARM directory.
Figure 101B:
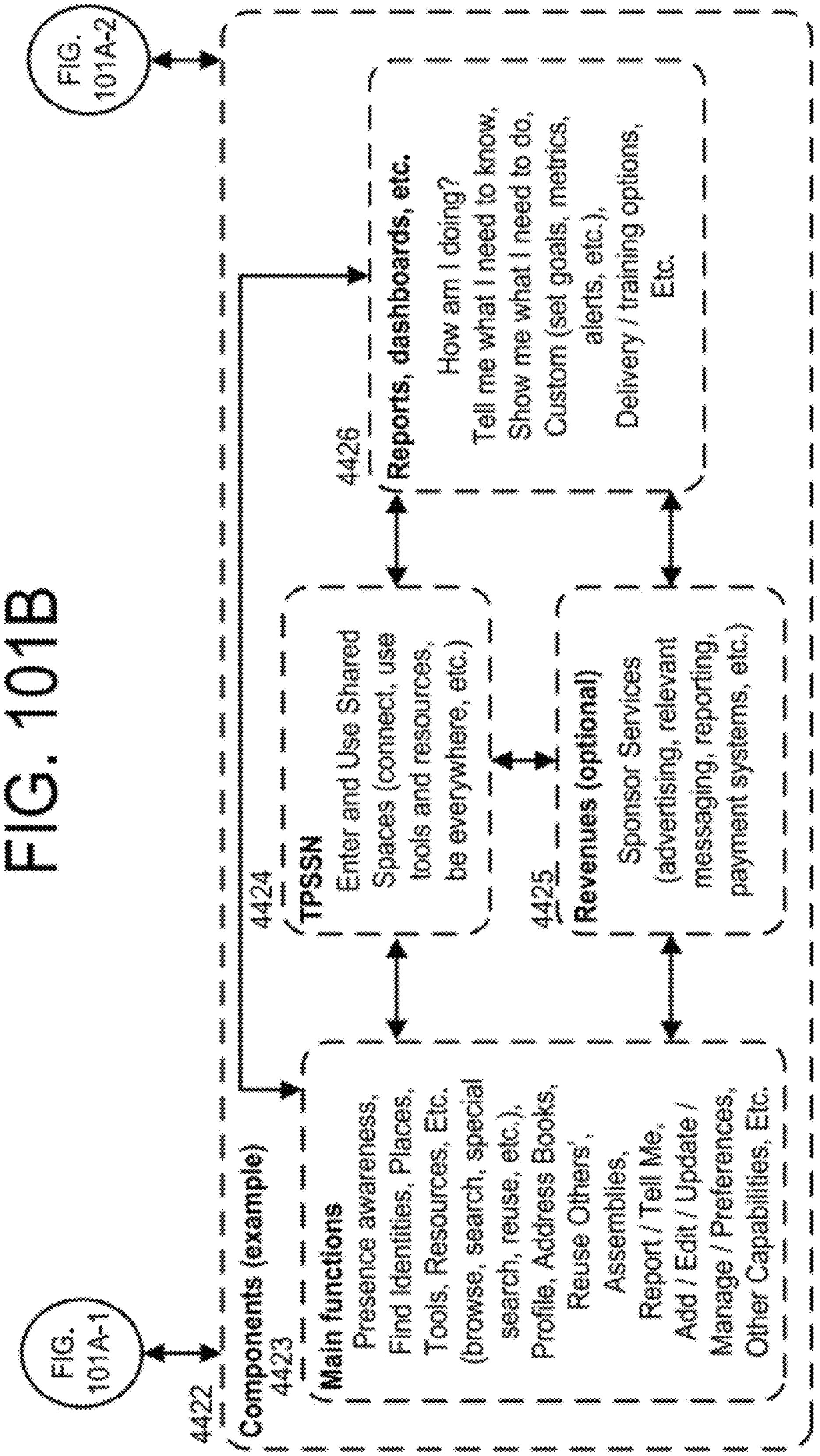
Figure 102A:
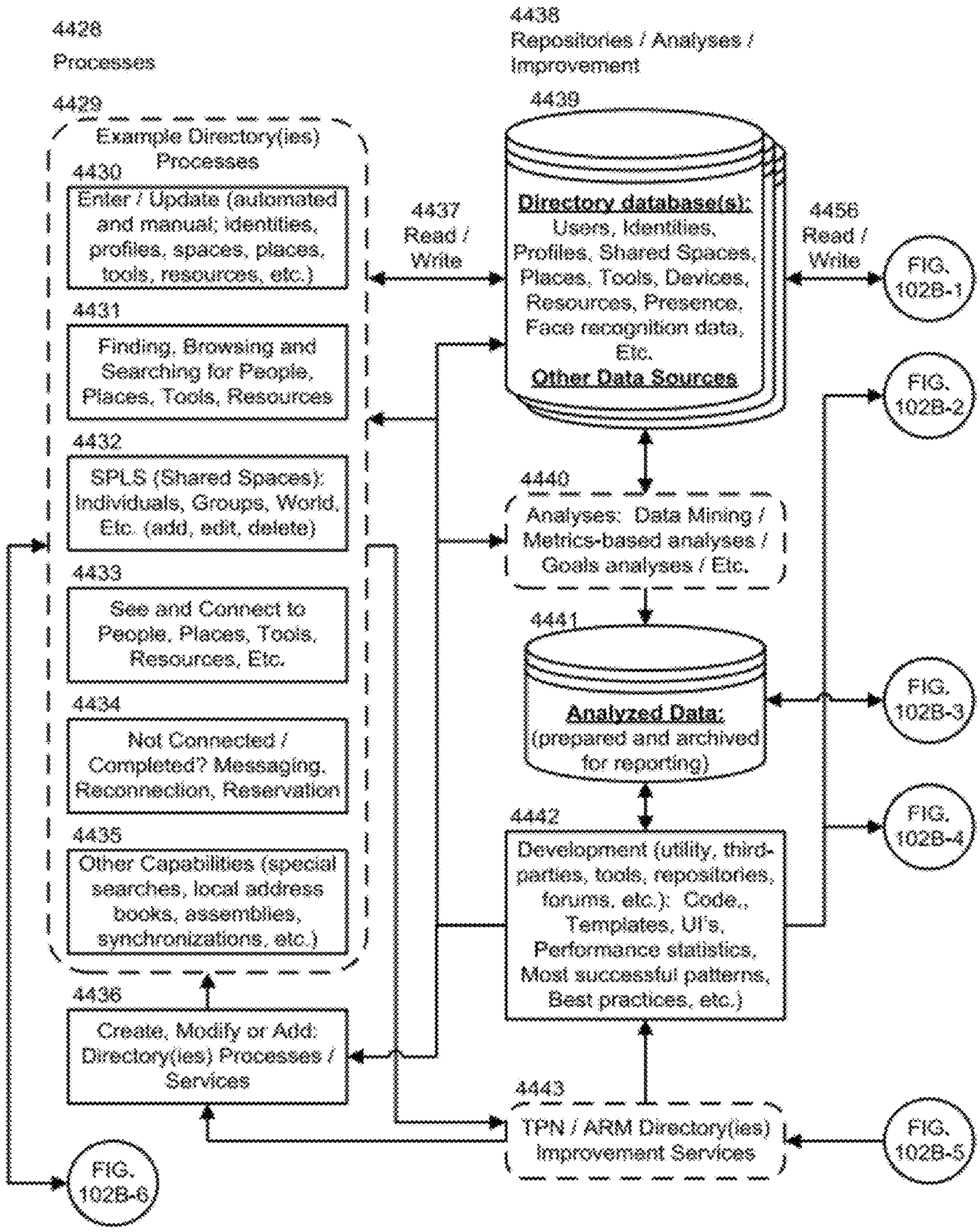
FIG. 102 is a block diagram showing some examples of ARM directory(ies) processes, data storage, lookup services, analyses/reporting, etc.
Figure 102B:
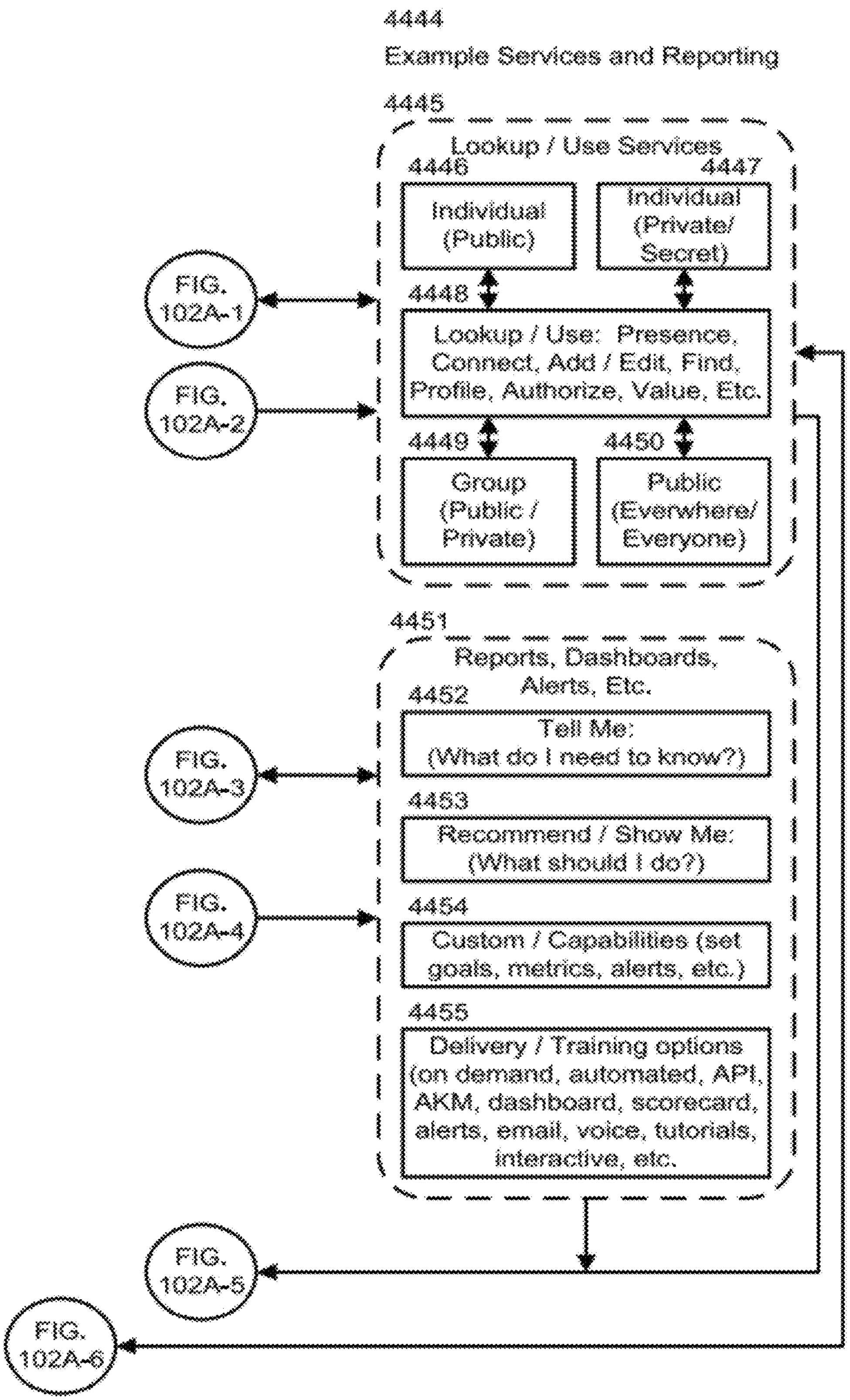
Figure 103:
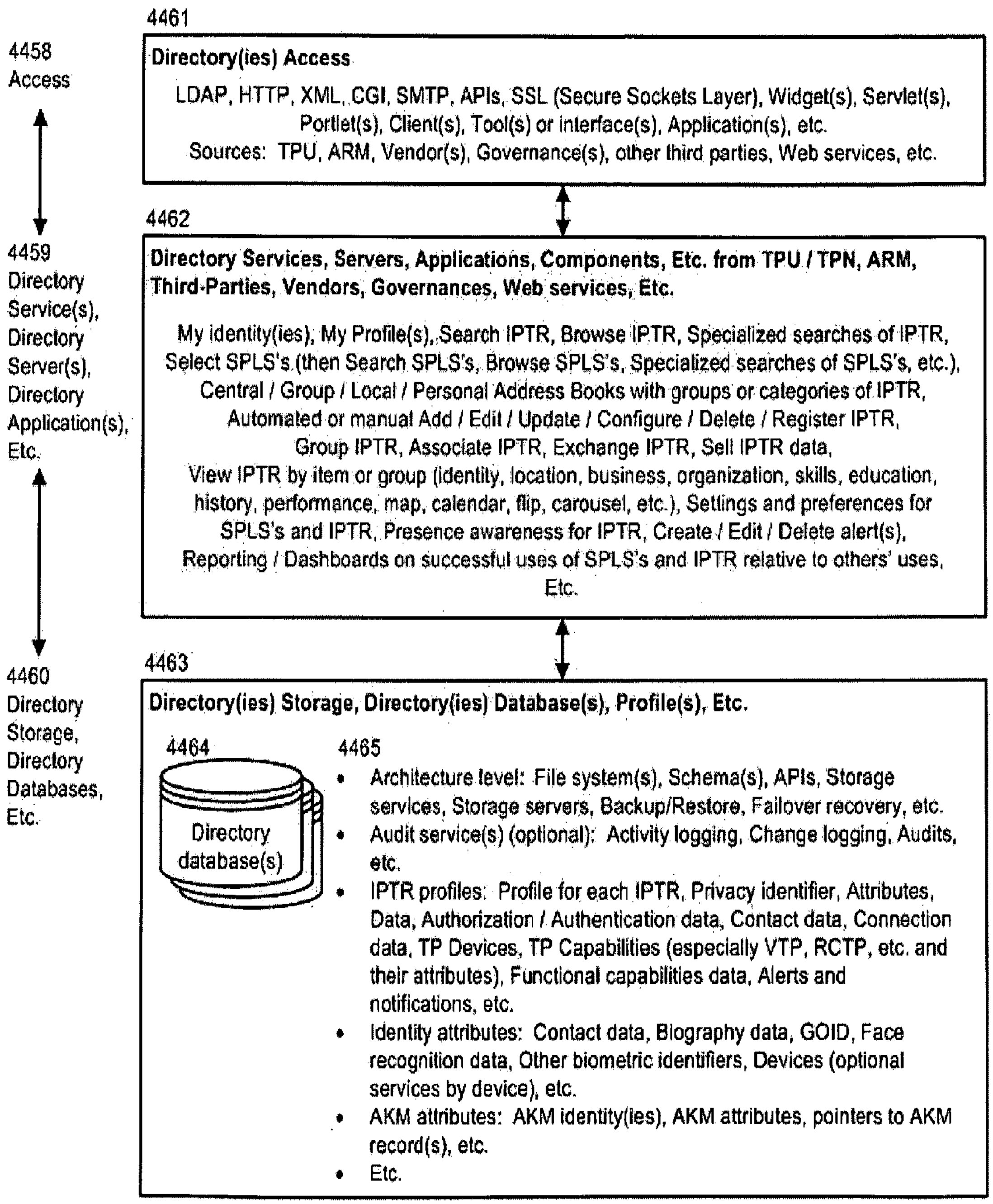
FIG. 103 is a block diagram showing some examples of an abstracted ARM directory(ies) architecture.

FIG. 101: It is another object of the ARM to provide an ARM Directory that provides presence awareness for making SPLS connections; the ability to find Identities, Places, Tools, Resources, etc. (including browsing, searching, special searching, saving connections to SPLS lists, etc.) to evaluate, connect to, admit for entrance, etc.; having a personal profile that may be automatically and/or manually added, updated, edited, etc.; used for reporting by means such as data mining, comparative analyses, etc.; Etc. FIGS. 102, 103: It is another object of the ARM Directory to utilize systematic directory processes, services, reporting, data, storage, etc.

Figure 104:
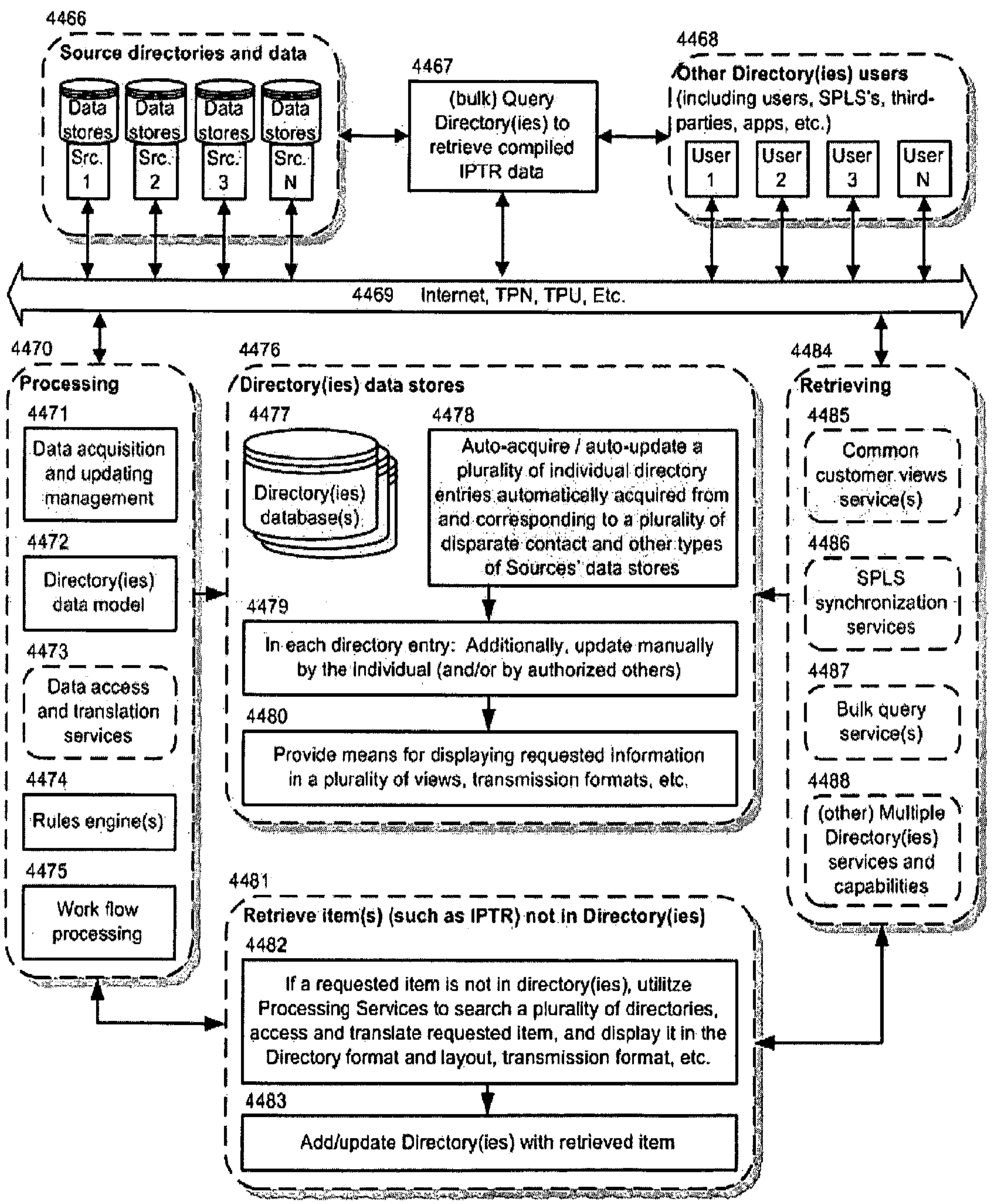
FIG. 104 is a block diagram showing some examples of enterting, retrieving and processing directory entries.
Figure 105:
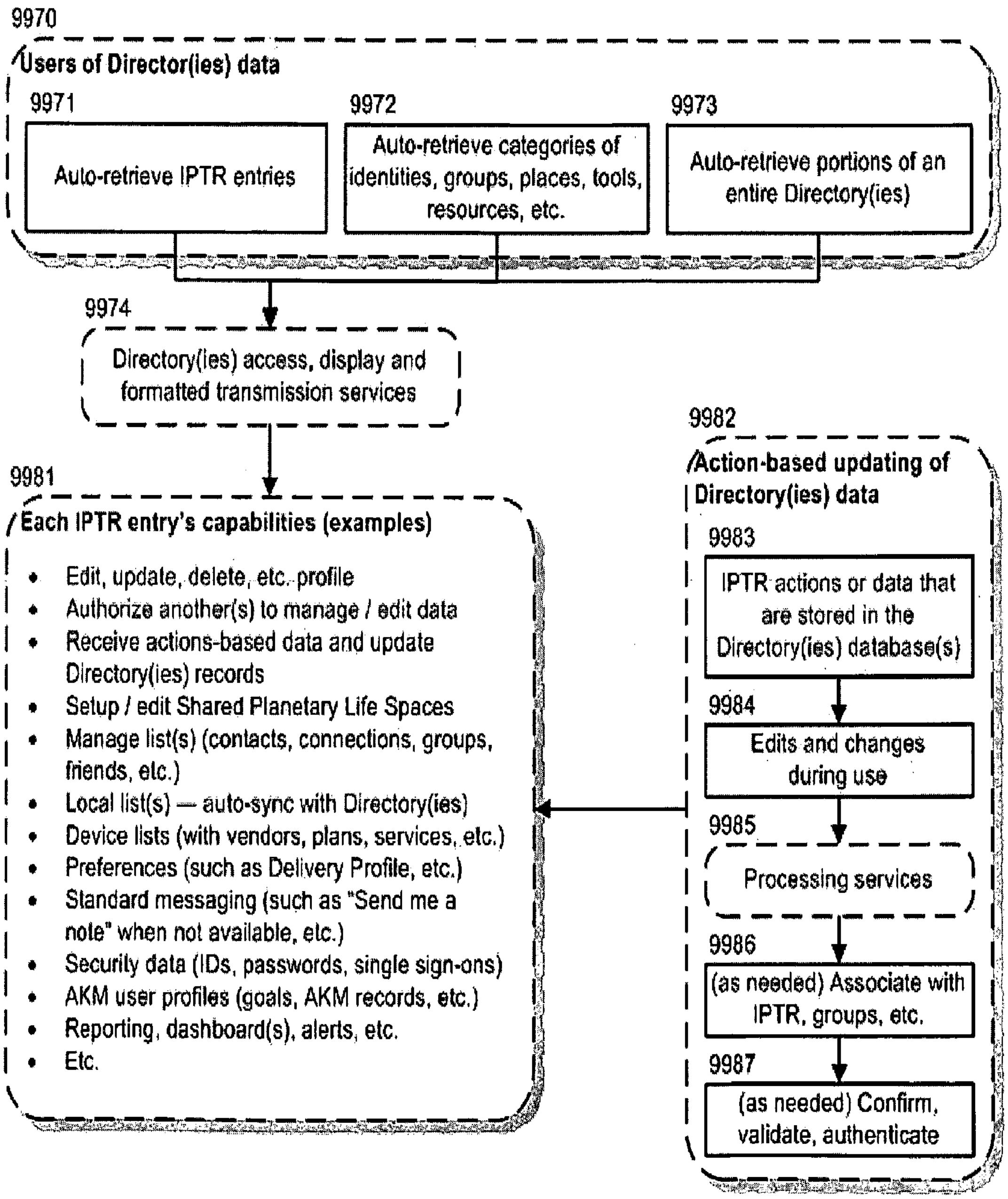
FIG. 105 is a block diagram showing some examples of using and updating directory data.

FIGS. 104, 105: It is another object of the ARM to add, enter and update ARM Directory entries both automatically and manually, including profiles for each IPTR (Identities, Places, Tools, Resources, etc.) and both copying and reuse of the best available profile/data for each IPTR.

Figure 106:
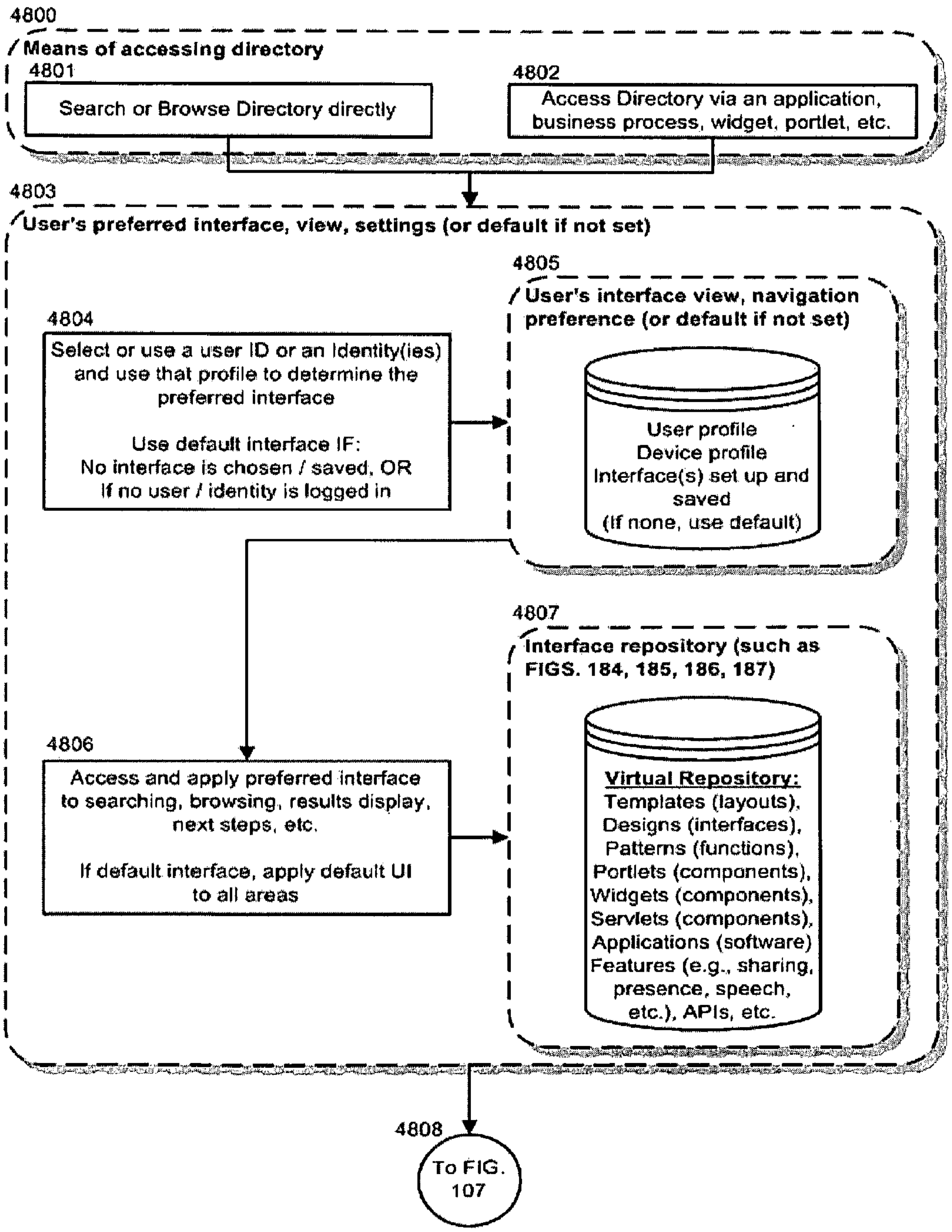
FIG. 106 is a block diagram showing some examples of directory search and browsing interfaces for IPTR.
Figure 107A:
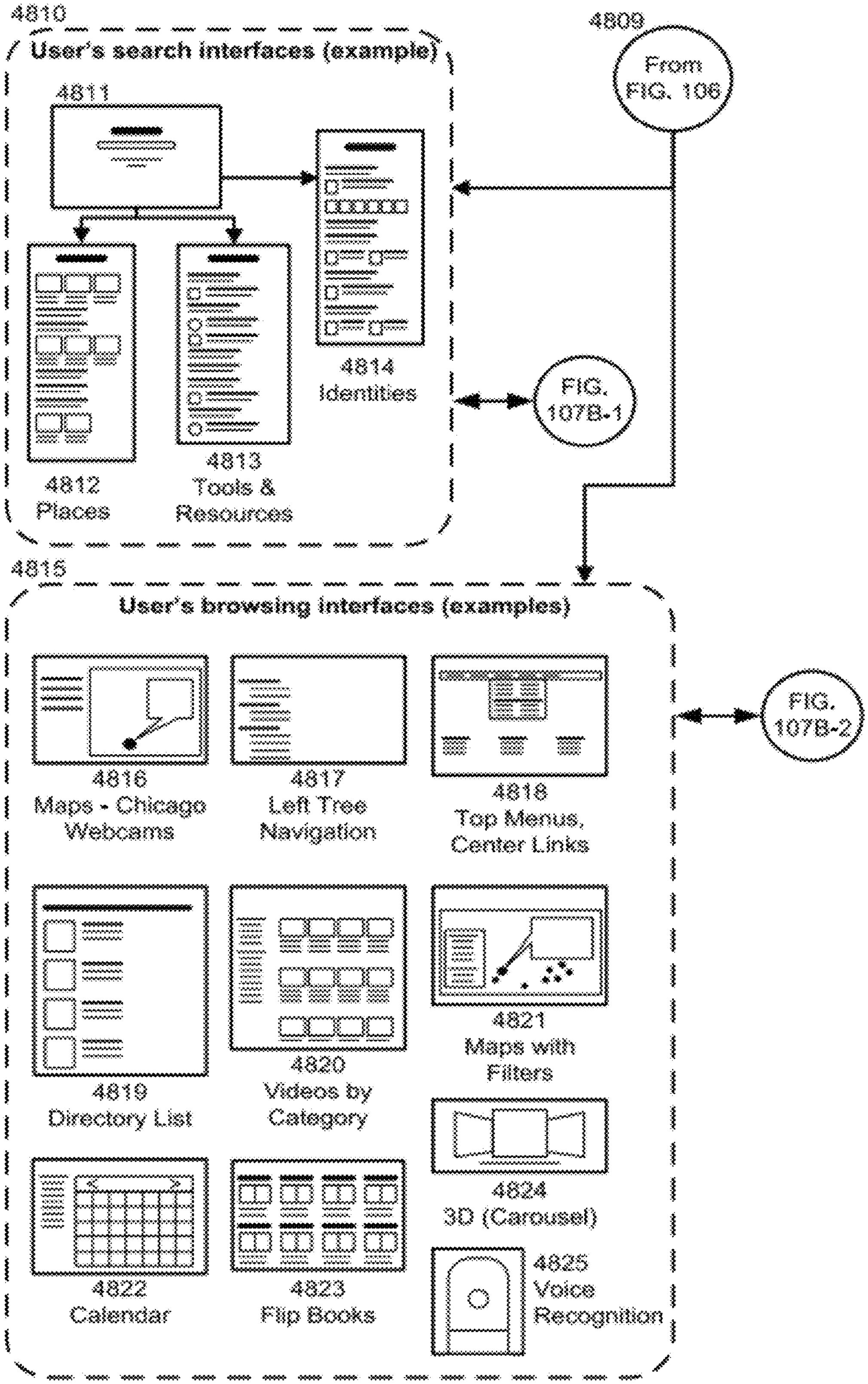
FIG. 107 is a pictorial block diagram and flowchart showing some examples of optimizing searching and browsing interfaces.
Figure 107B:
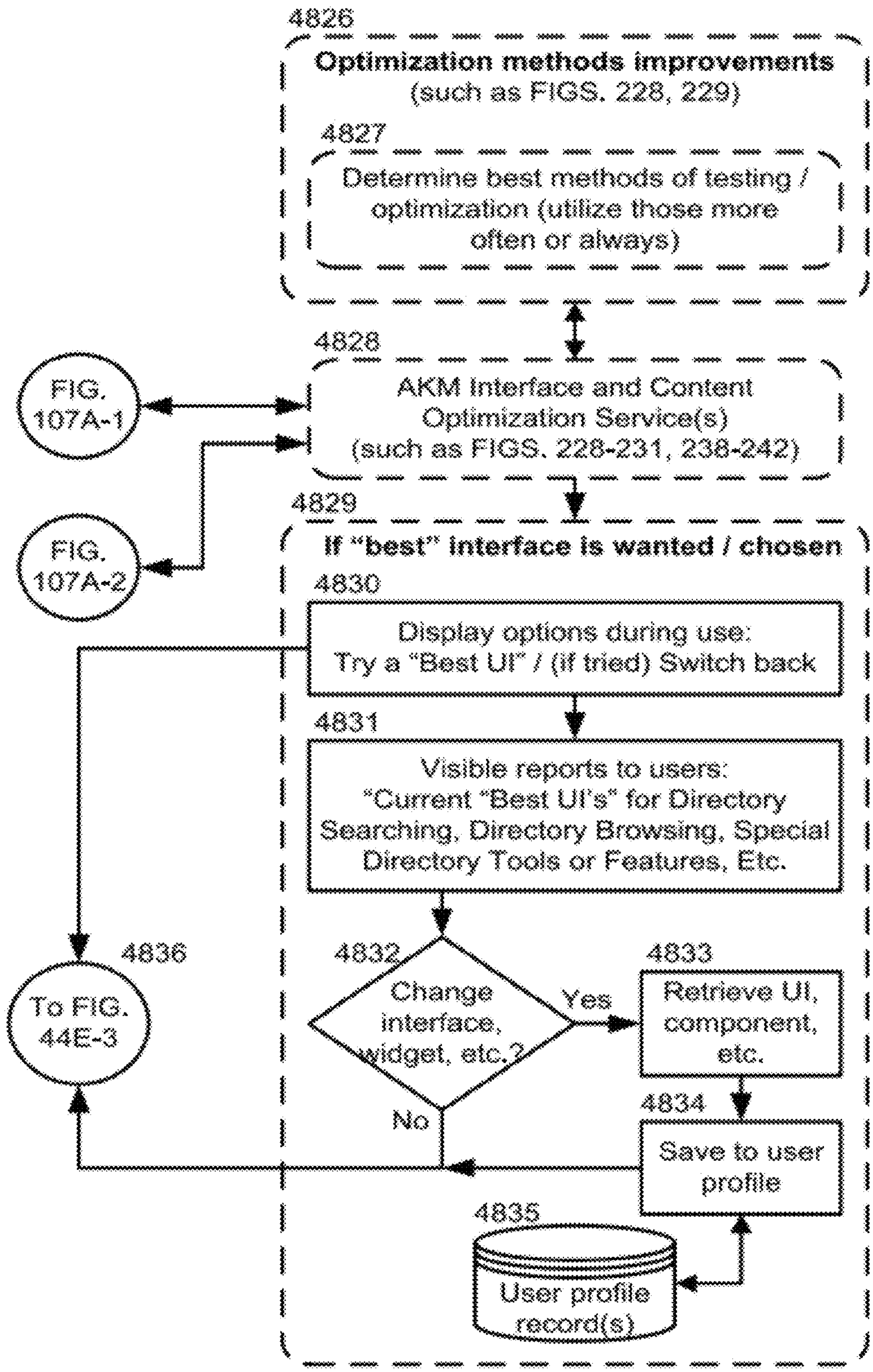
Figure 108:
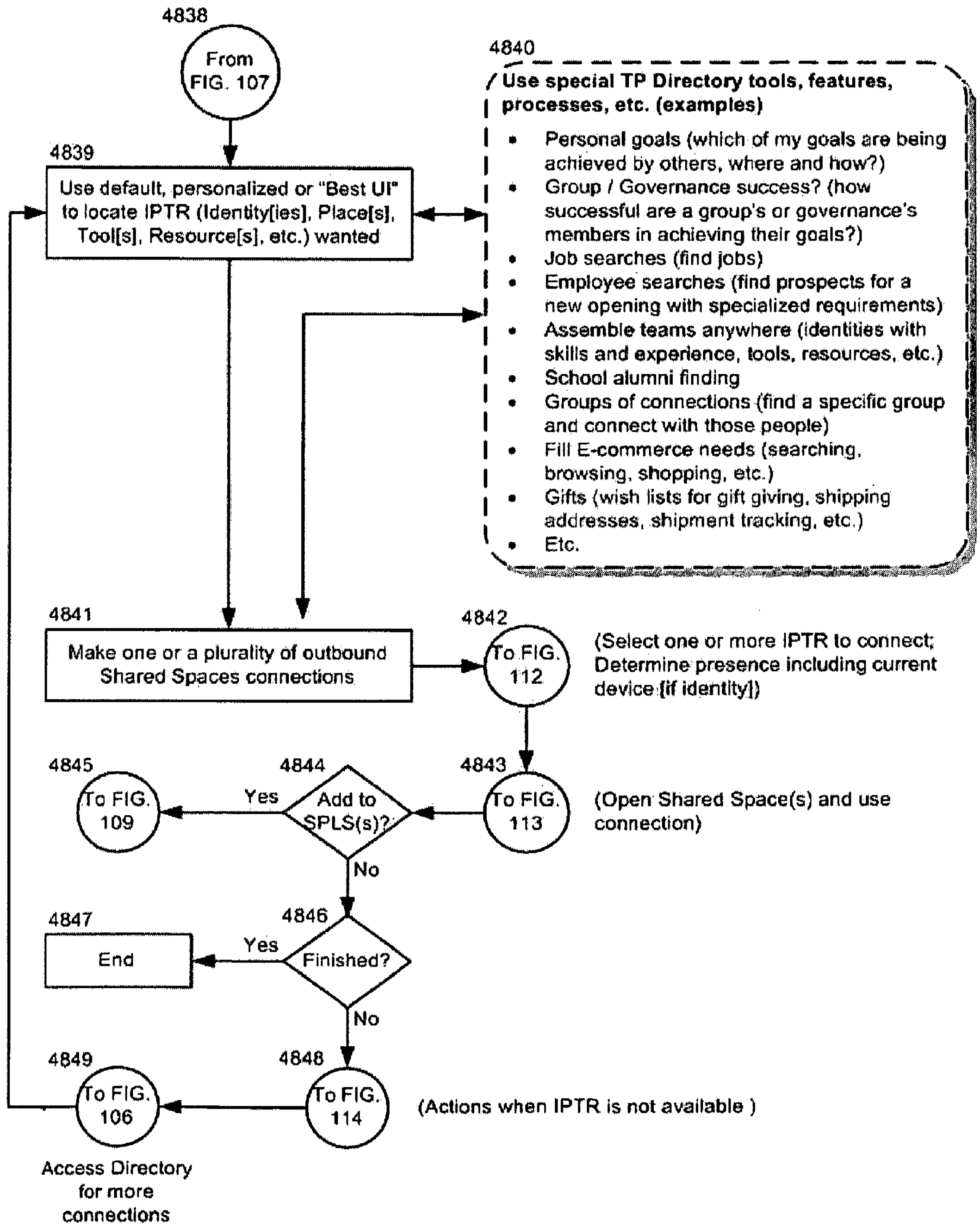
FIG. 108 is a flow chart showing some examples of procedures for selecting IPTR, connecting to it, making it part of a shared space, etc.

FIGS. 106, 107: It is another object of the ARM to provide varied yet consistent interfaces (such as in some examples for searching and browsing the ARM Directory), including continuously improving said interfaces; to achieve this, the TP interface repository is employed, along with TP AKM optimization (here applied to interfaces). FIG. 108, 109: It is another object of the ARM Directory that when an IPTR is found and selected it may be connected to, or added to an SPLS(s); additionally said IPTR may be added, edited and/or updated in the ARM Directory; additionally said IPTR may be associated with one or a plurality of SPLS's.

Figure 110:
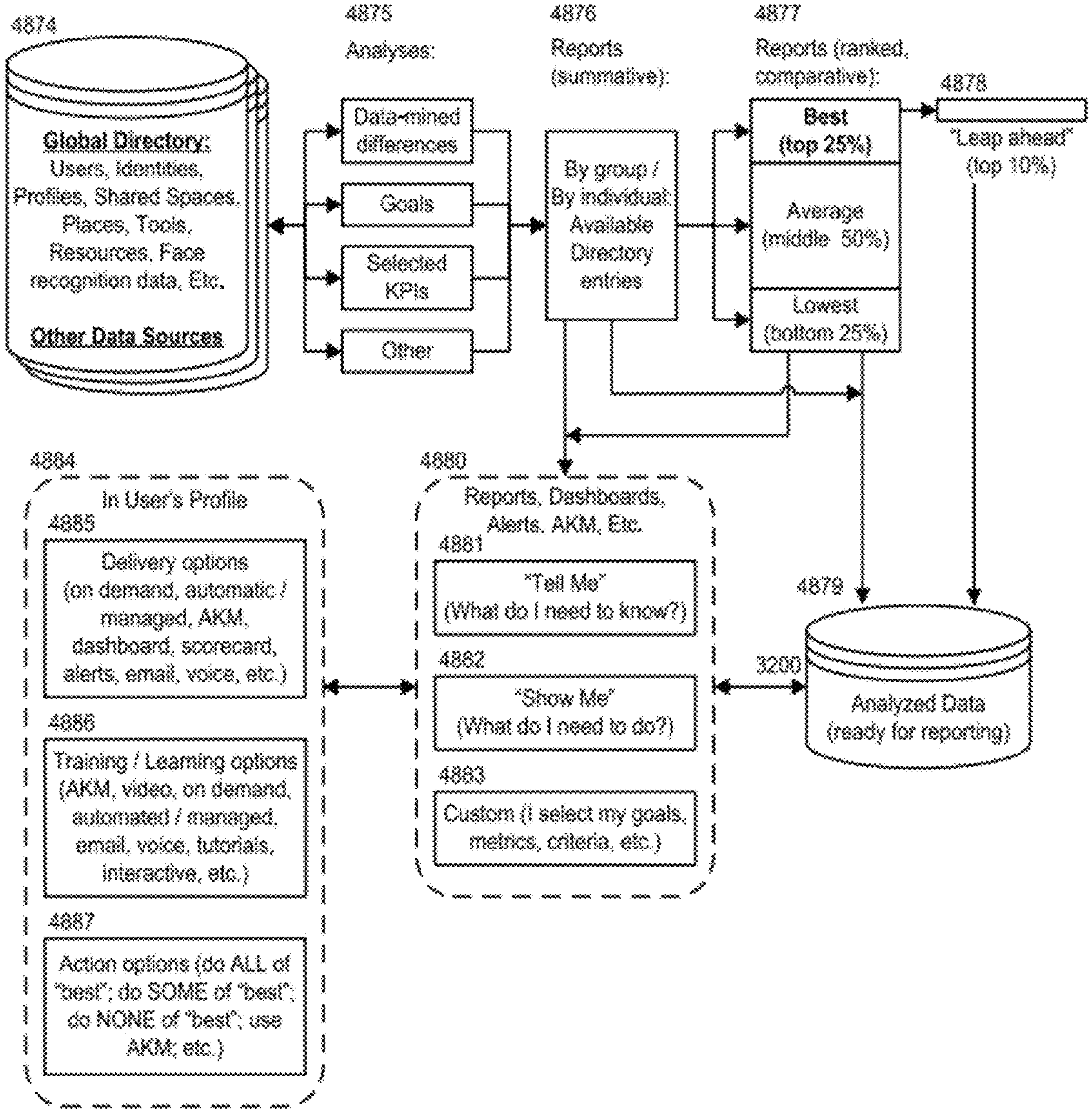
FIG. 110 is a block diagram showing some examples of directories reporting and/or recommendation processes.
Figure 111:
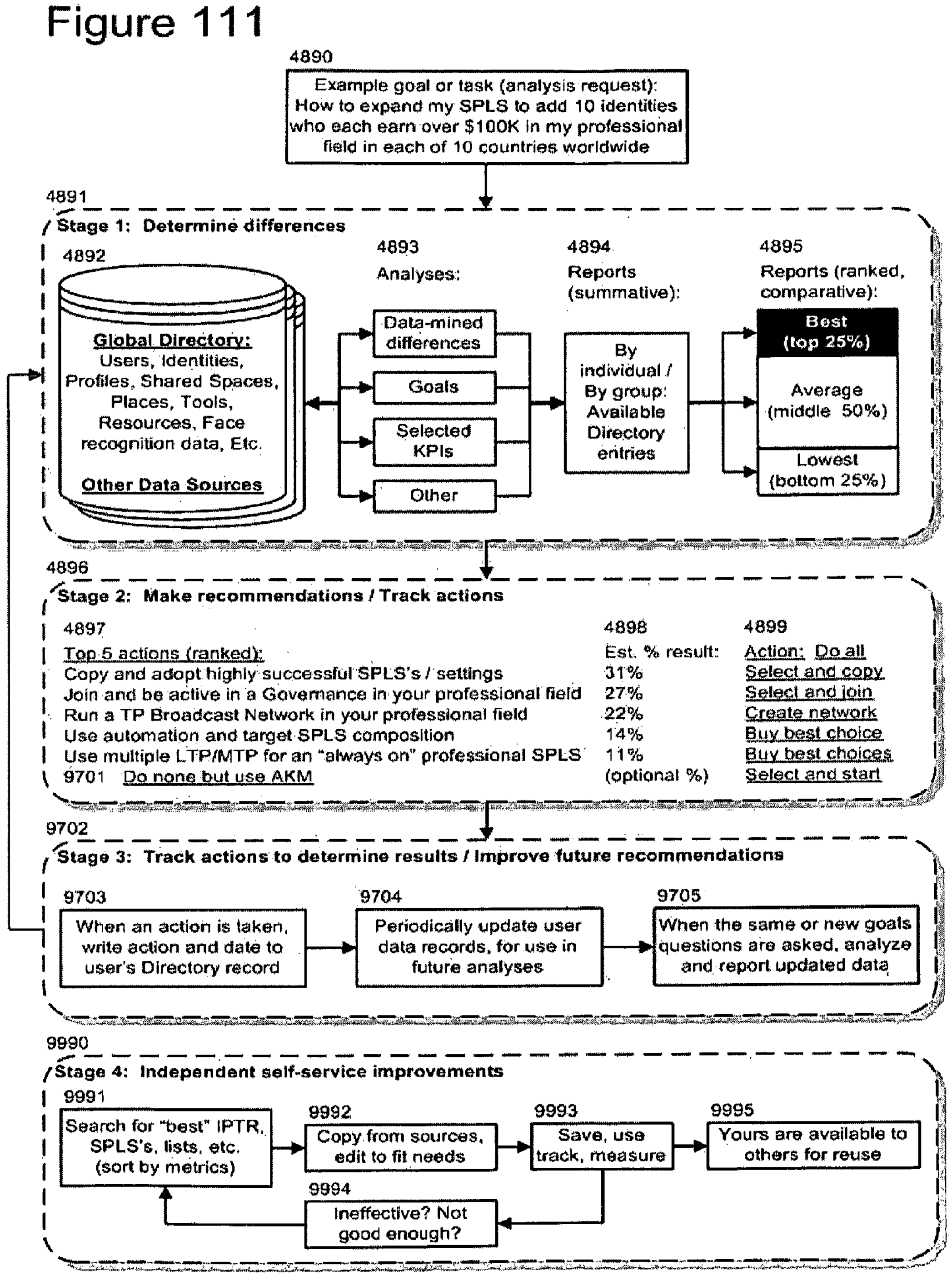
FIG. 111 is a block diagram and flowchart showing some examples of recommendation processes that support rapid switching to improvments by a plurality of users, such as in some examples actionable choices to help achieve personal and/or group goals or tasks.

FIGS. 110, 111: It is another object of the ARM to provide data mining, data analyses, reporting and an optimization process such as in some examples making comparisons to determine in some examples which are "best," in some examples which are "average," in some examples which are "lowest;" in some examples differences, and in some examples recommendations so that those who are average or low may determine what to do in order to raise their level to become equivalent to the "best." In addition, actions based on said recommendations may be tracked in order to determine results and to improve future recommendations.

Figure 112A:
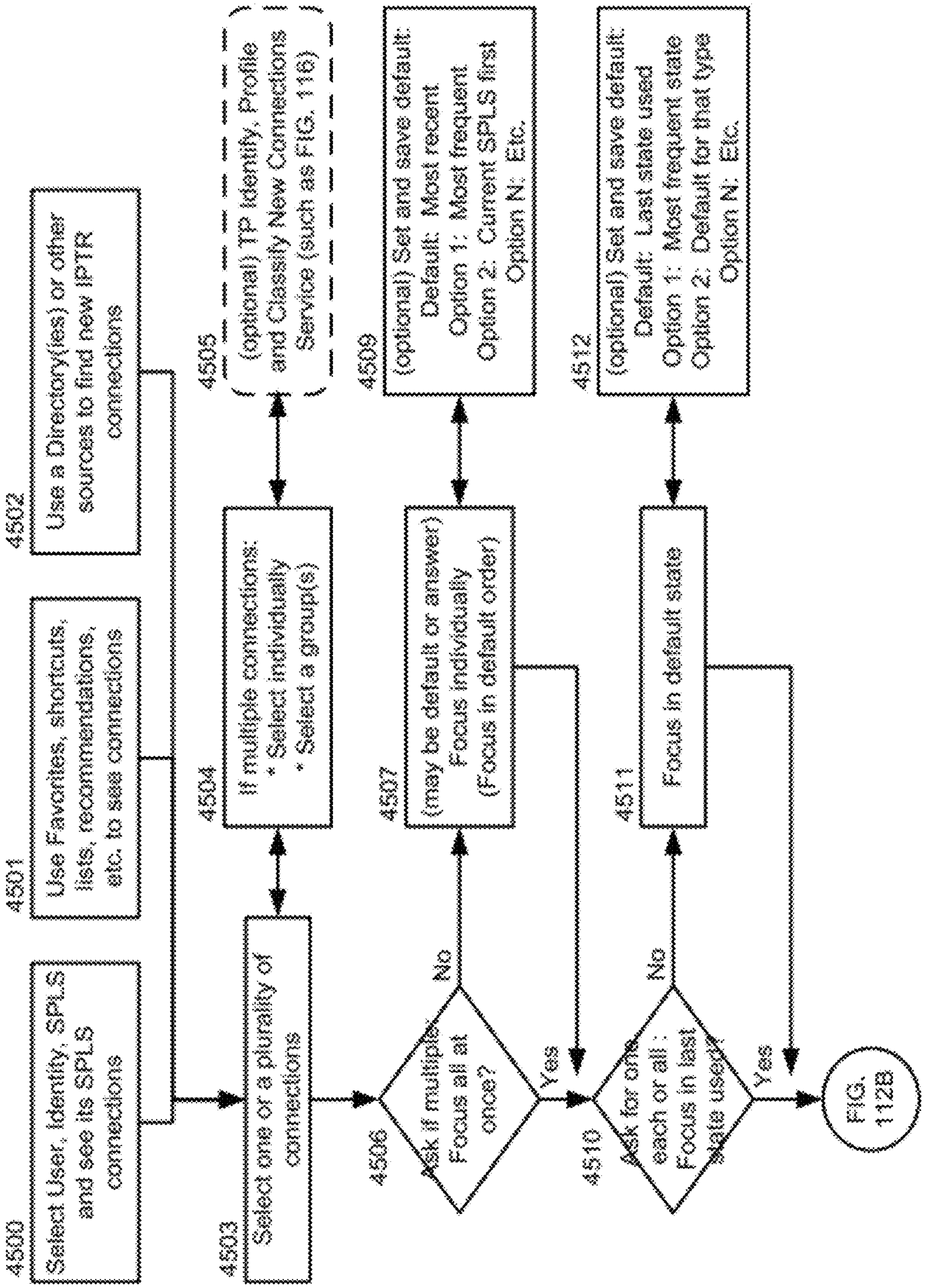
FIG. 112 is a flow chart showing some examples of procedures for selecting and opening an outbound shared space(s) including connecting to IPTR.
Figure 112B:
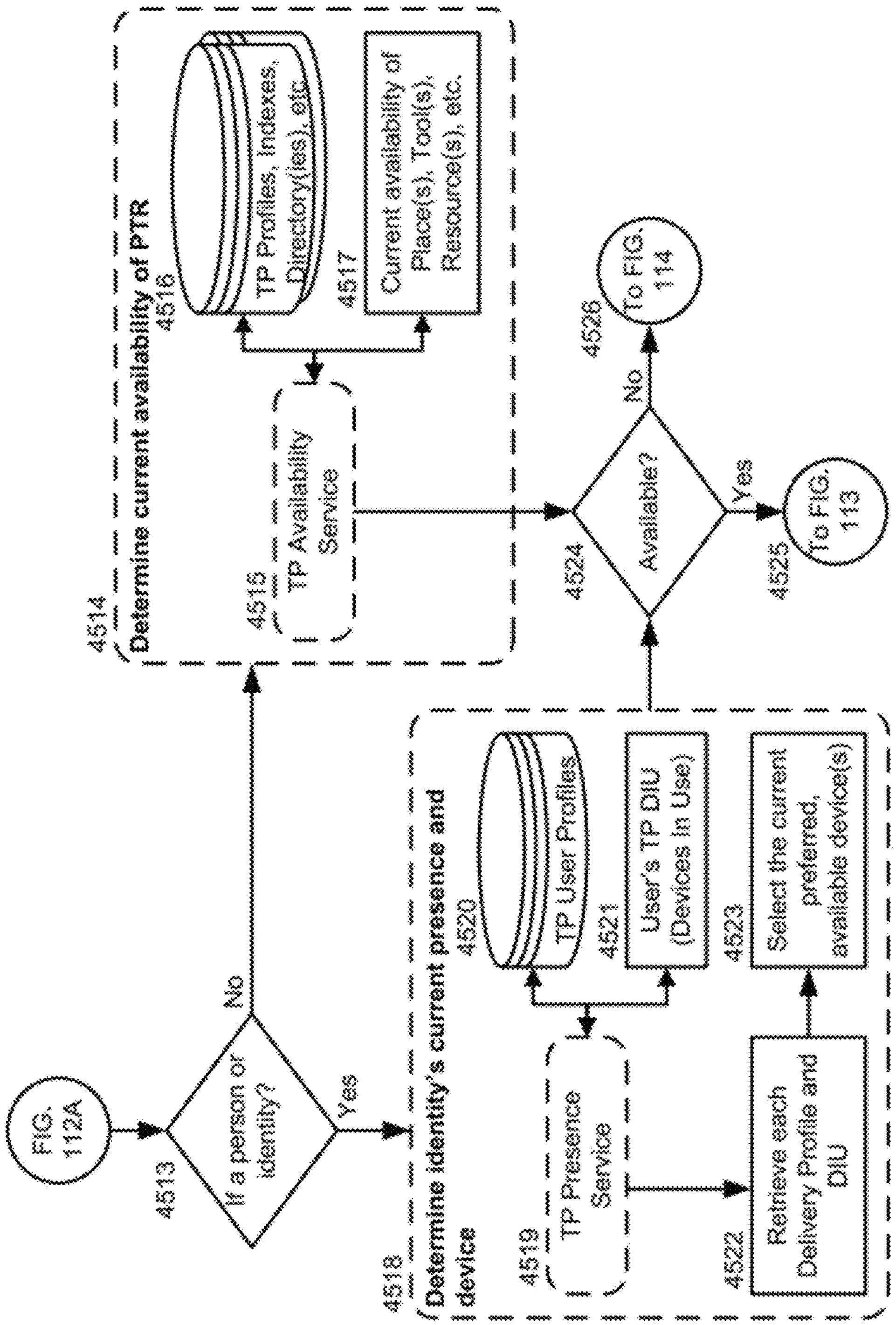
Figure 113:
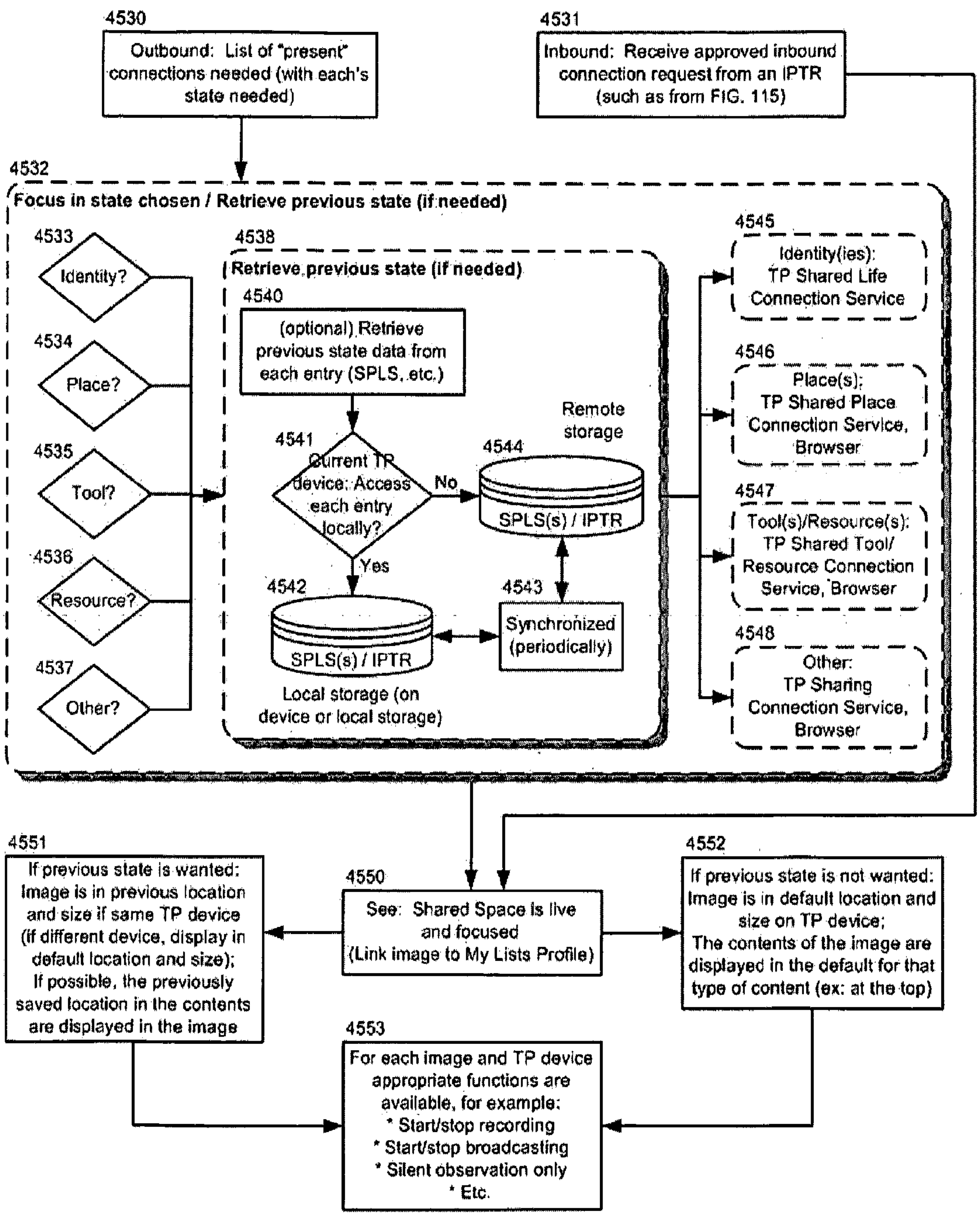
FIG. 113 is a flow chart showing some examples of procedures for opening an outbound or inbound shared space(s) with previous state retrieval (if needed).
Figure 114:
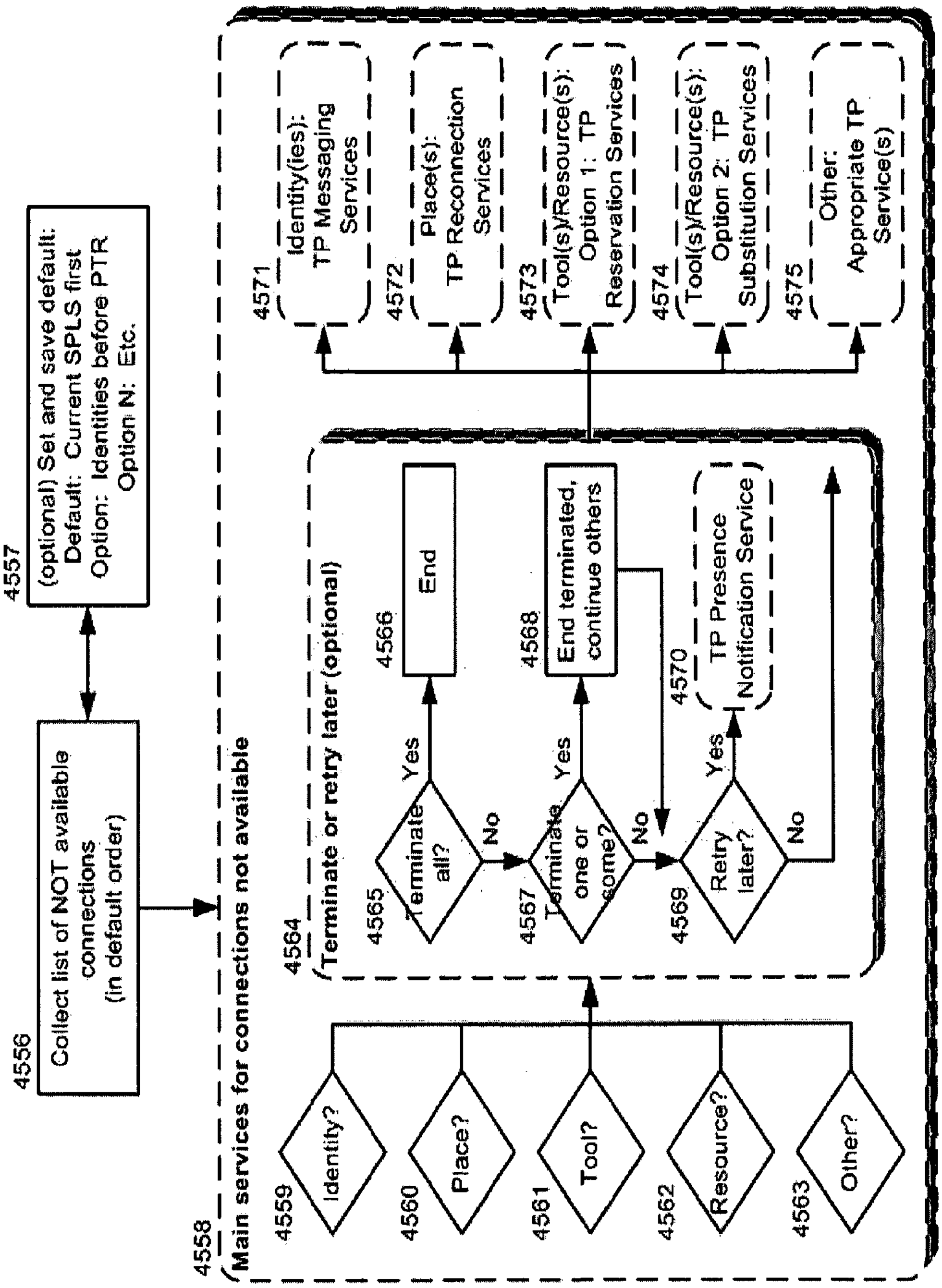
FIG. 114 is a flow chart showing some examples of procedures for actions when an outbound shared space IPTR is not available.
Figure 115:
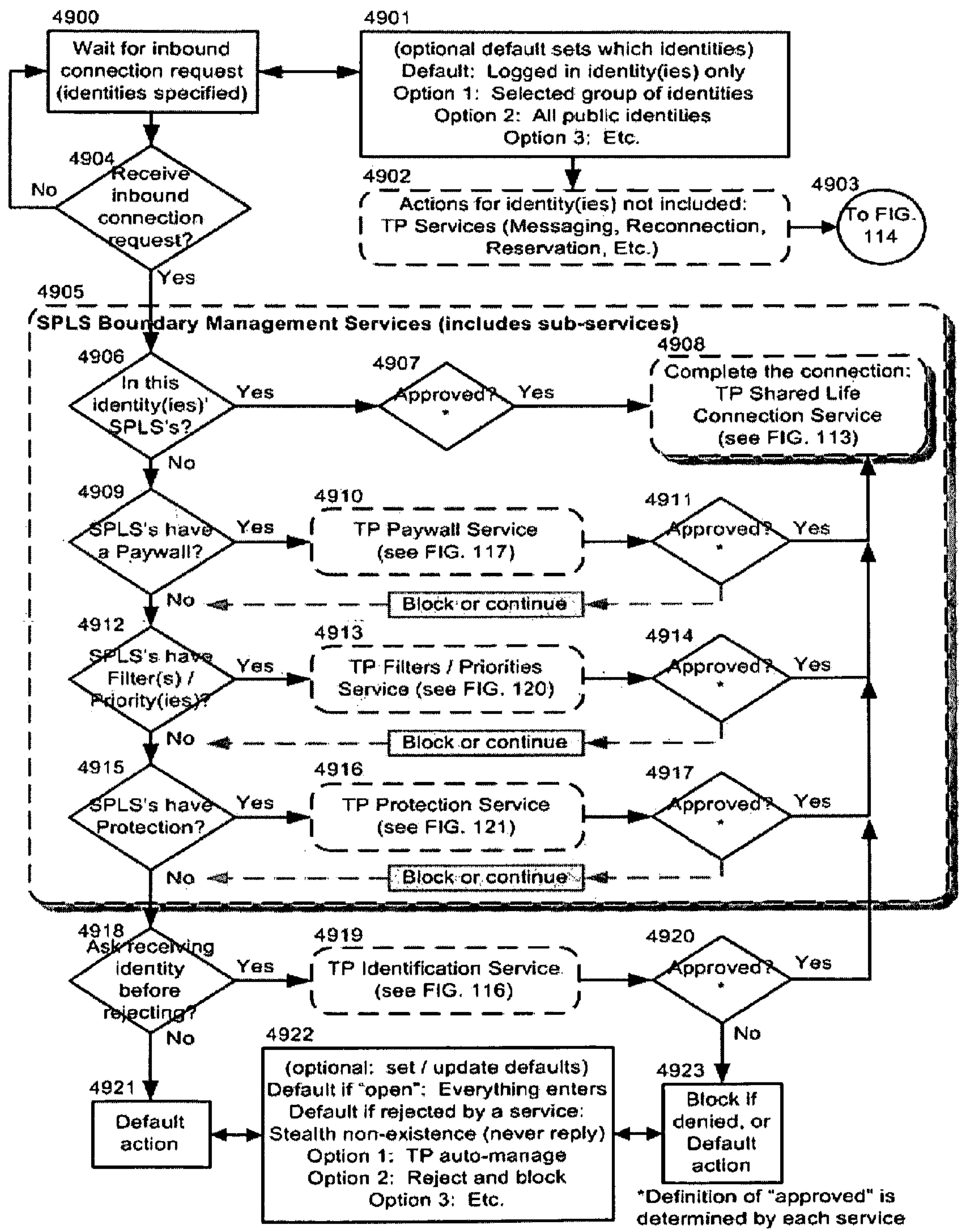
FIG. 115 is a flow chart showing some examples of procedures for inbound shared space(s) connections, including SPLS boundary manager service(s).
Figure 116:
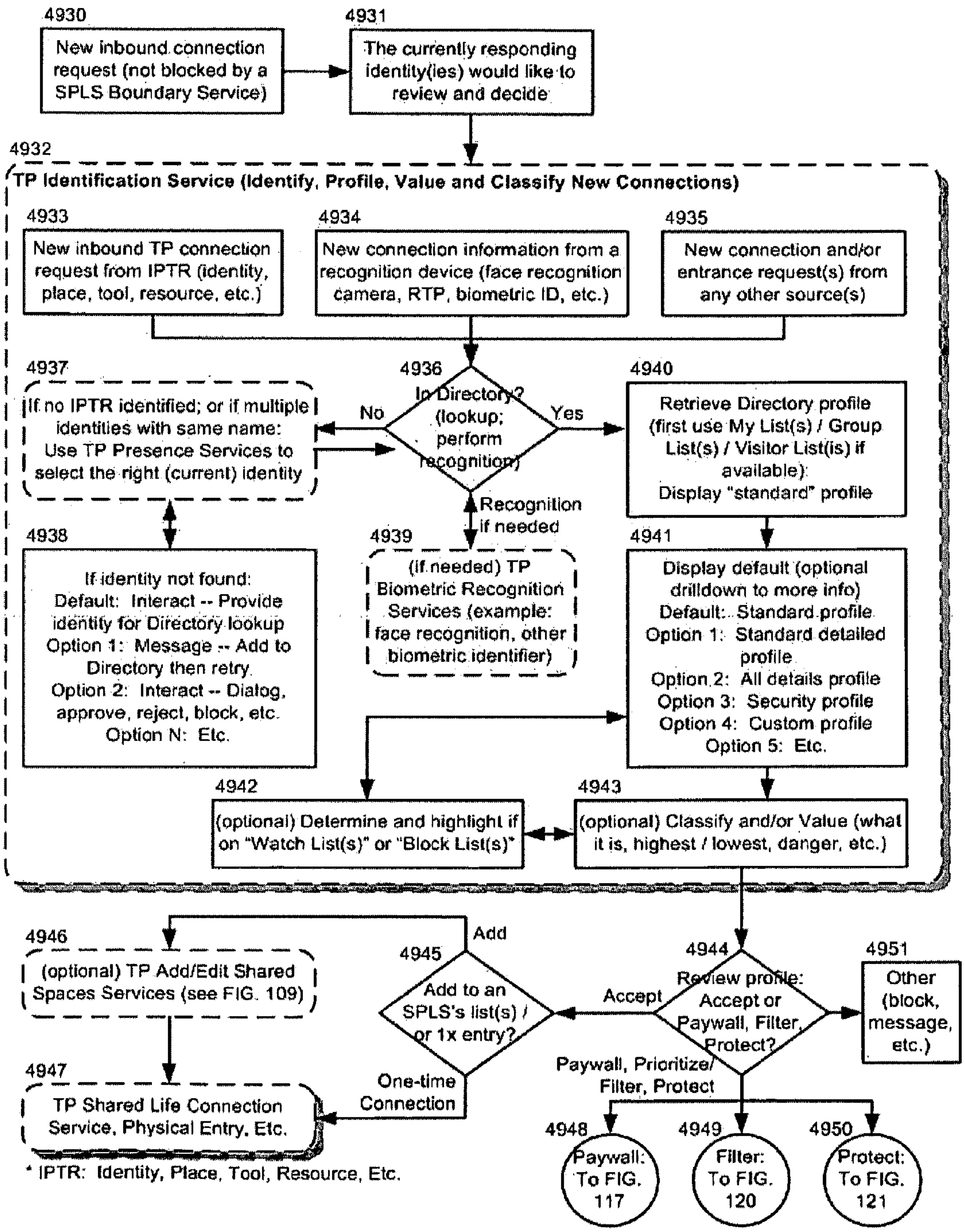
FIG. 116 is a flow chart showing some examples of procedures for an inbound shared space connection request including in some examples add to SPLS, paywall, filter, and/or protection.
Figure 117:
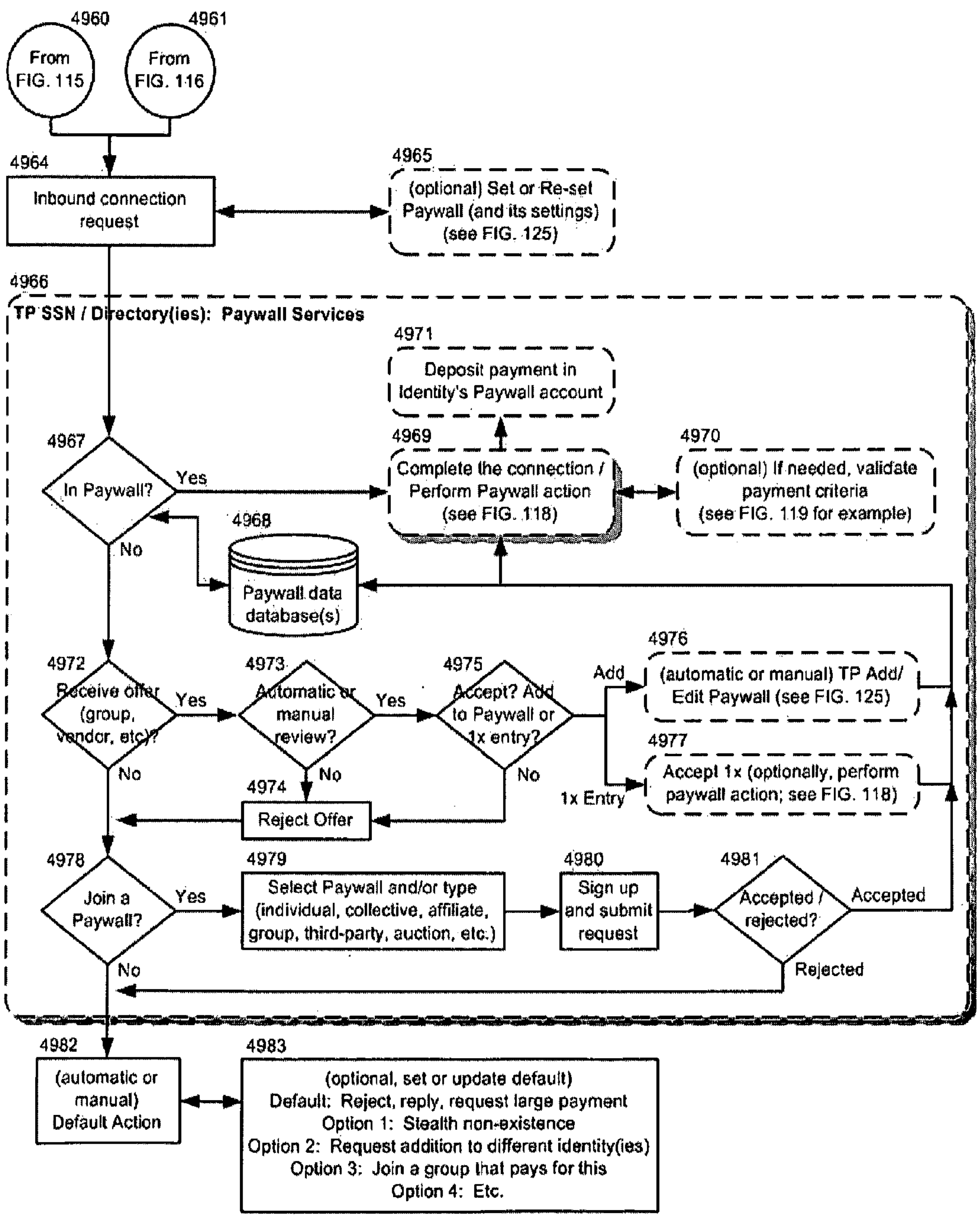
FIG. 117 is a flow chart showing some examples of procedures for managing a paywall boundary.
Figure 118:
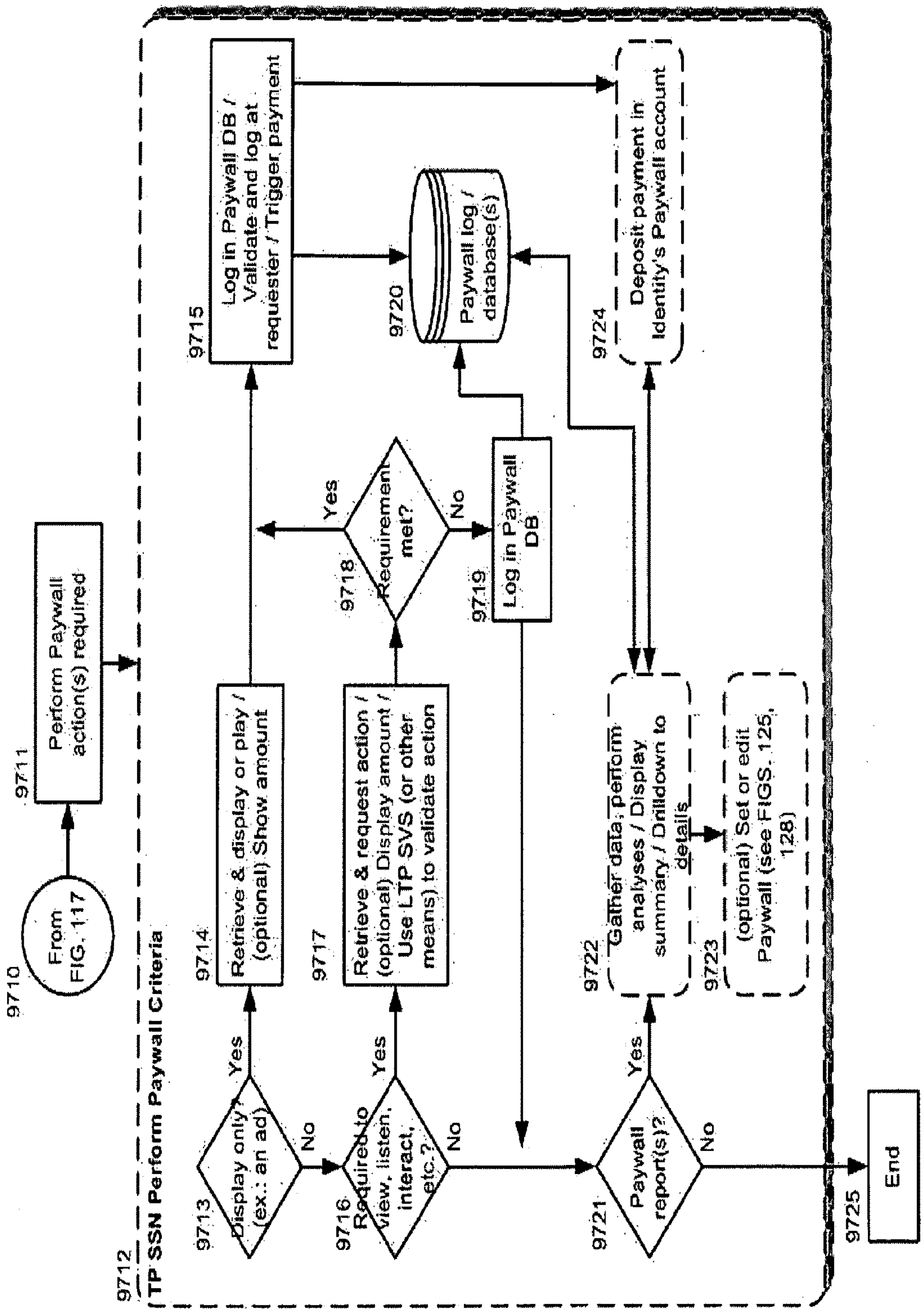
FIG. 118 is a flow chart showing some examples of procedures for performing paywall criteria, receiving paywall payments, paywall reports, etc.
Figure 119:
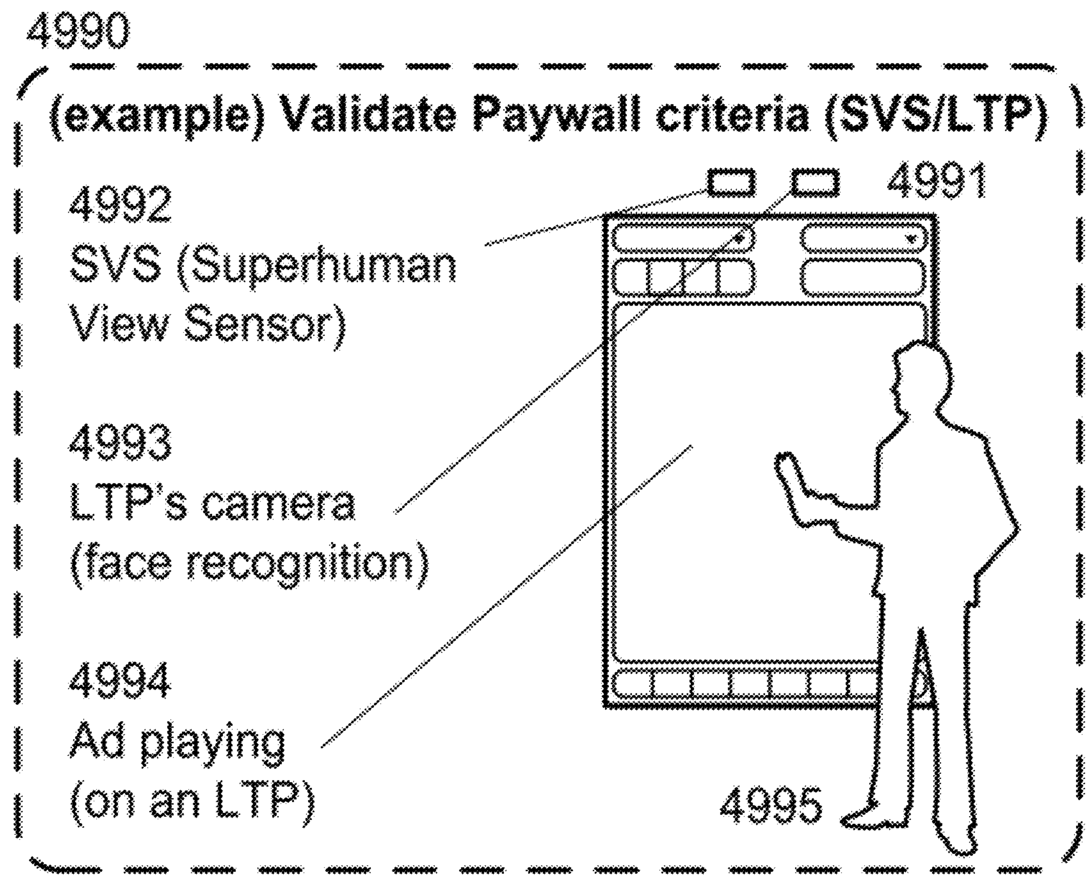
FIG. 119 is a pictorial block diagram illustrating an example of validating paywall criteria.
Figure 120:
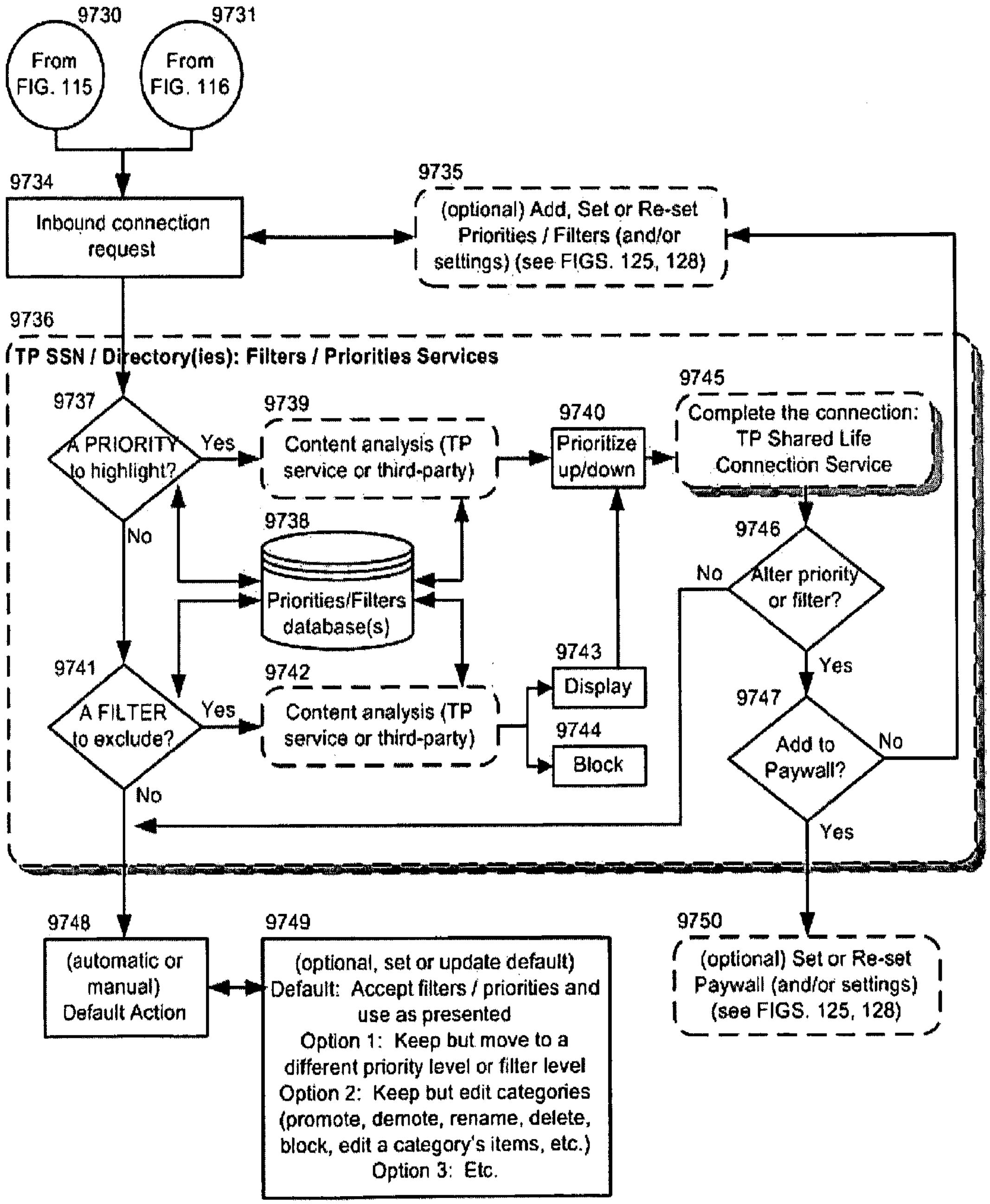
FIG. 120 is a flow chart showing some examples of procedures for priorities and/or filters processing.
Figure 125:
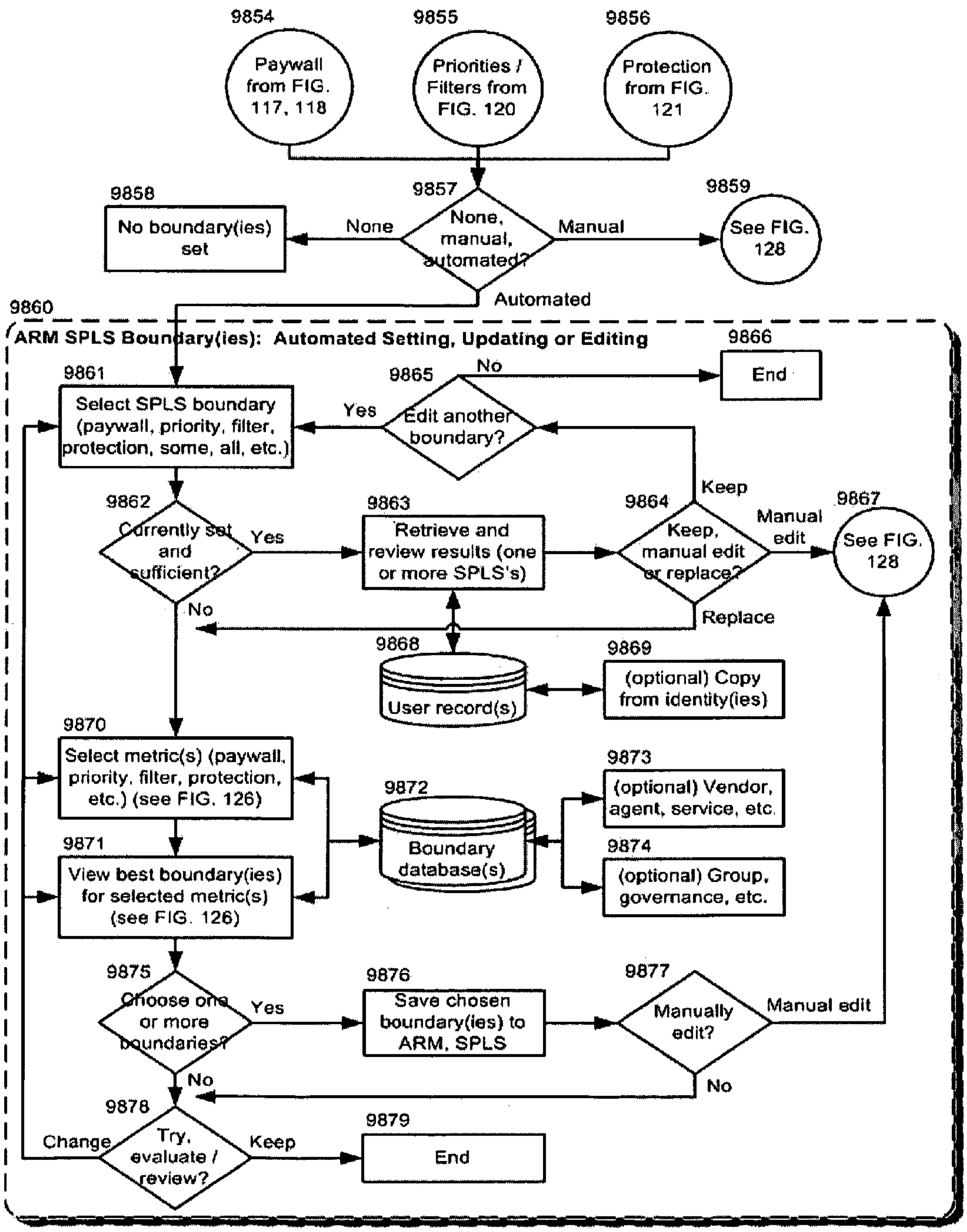
FIG. 125 is a flow chart showing some examples of procedures for automated setting, updating or editing of boundaries, including in some examples paywalls, priorities, filters, protections, etc.
Figure 126:
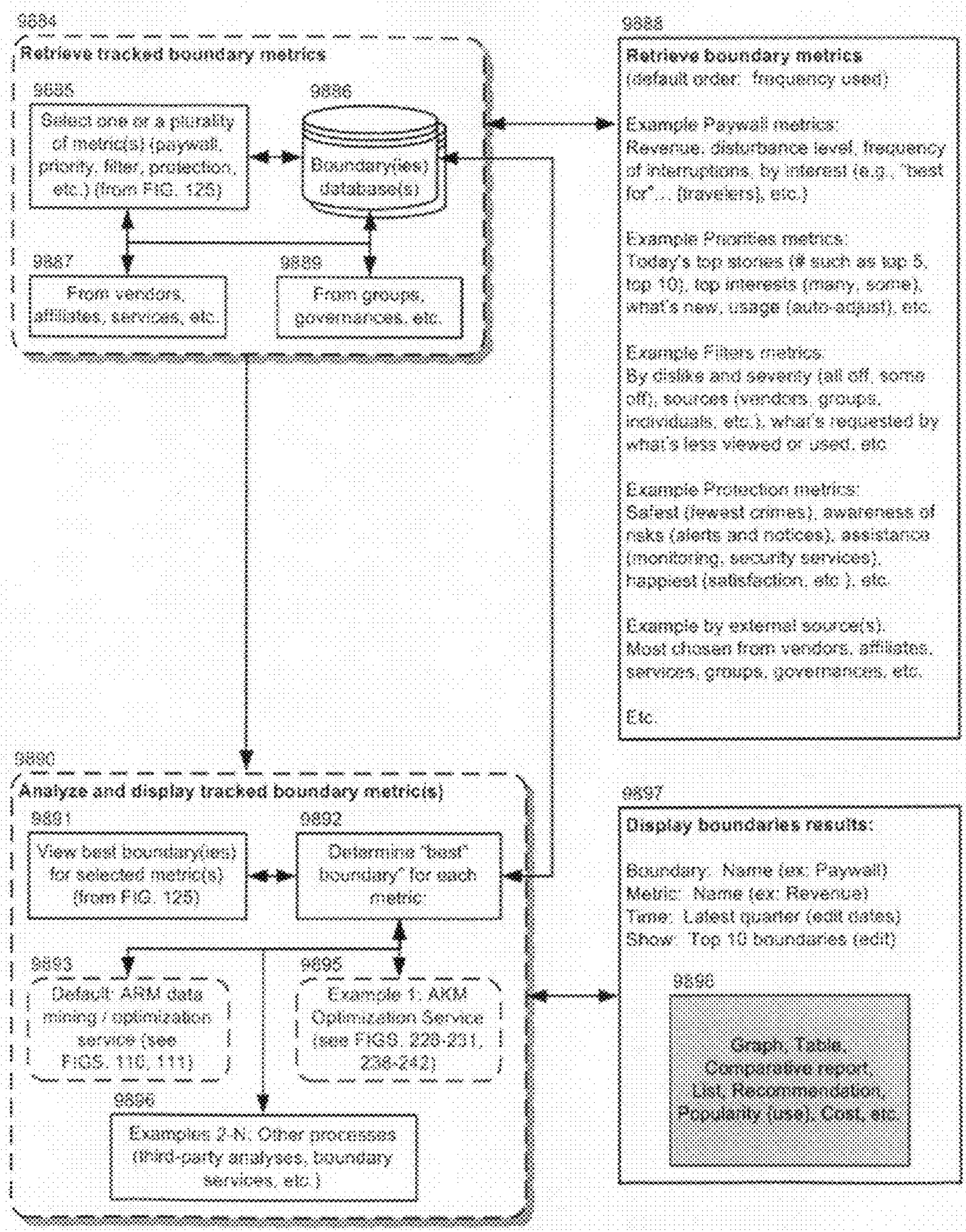
FIG. 126 is a flow chart showing some examples of procedures for retrieving, analyzing and displaying tracked boundary(ies) metrics.

FIGS. 112, 113, 114: It is another object of the ARM to enable outbound SPLS connections with IPTR, to enable inbound shared space connections from IPTR, to restore the previous state of said outbound and/or inbound connections when that is desired (such as when an identity switches between two or a plurality of devices), and to provide backup actions when an outbound SPLS connection is not available. FIGS. 115, 116: It is another object of the ARM to provide SPLS Boundary Management, with a plurality of boundaries illustrated as a model for boundary management that differentiates alternate realities; with in some examples said SPLS boundary illustrations including Paywalls, Priorities, Filters, Protections, etc.; including means for identifying inbound connections, auto-profiling them, accepting and/or managing their entry by said boundary management, permitting one-time connection, permitting or blocking physical entry, adding the connection to one or a plurality of SPLS's, and/or taking other actions. FIGS. 117, 118, 119: It is another object of the ARM to provide one or a plurality of Paywalls boundaries wherein one or a plurality of identities may be paid for actions such as permitting an advertisement to be received and displayed, watched and listened to, and (optionally) have the viewing of the ad confirmed and validated. Additionally, a vendor or other party may make one or a plurality of Paywall offers that may be reviewed and/or accepted either automatically and/or manually. Additionally, an identity(ies) may request to join one or a plurality of Paywalls of various types such as individual, collective, affiliate, group, third-party, auction, etc. Additionally, Paywall reporting provides analyses, summaries, details, etc. on Paywall earnings with branching to setting and/or editing said Paywall(s). FIG. 120: It is another object of the ARM to provide one or a plurality of Priorities boundaries and/or Filters boundaries wherein inbound content may be displayed or blocked, and if displayed may be prioritized such as by its position, highlighting, design, categorization, etc. Additionally, the results of said Prioritization and/or Filtering may be utilized to alter said Priorities and/or Filters, add an item to a Paywall, etc. FIGS. 121, 122, 123, 124: It is another object of the ARM to provide one or a plurality of Protection boundaries that include both digital connections and/or physical entry, and provide said Protection boundaries to Identities (including individuals, families, households, etc.), groups, and the public. In each of these categories IPTR that would like to enter either an SPLS and/or a physical location may be identified, valued, classified or categorized, admitted in, rejected, filtered, asked to enter through a Paywall only, rejected, blocked, or protected against while physically or digitally present. Said Protection services may also include identifying preferred individuals and providing special treatment and/or services for them. Protection may also include identification of individuals on various watch lists, law enforcement lists, etc.; automated and/or manual interactions with individuals to confirm or correct their identification; notification and/or monitoring of said individuals by security or other services; automated tracking, recording, etc. of individuals across multiple cameras and/or locations; alerts for security and/or law enforcement personnel or assistance; etc. FIGS. 125, 127, 128, 129: It is another object of the ARM to include no boundaries and completely open SPLS's; or alternatively, either automated and/or manual setting, updating or editing of boundaries. Boundaries may be set automatically based upon criteria such as one or a plurality of track metrics, its source (such as a vendor, agent, service, etc.), or one's membership in a group, governance, or other organization that provides said boundary(ies) and its settings. Alternatively, said boundary may be manually set, edited or updated by selecting and retrieving one or a plurality of complete boundaries to review, by displaying the "best" boundaries based on one or a plurality of metrics, recommendations from a third-party or group, or by other means. Alternatively, a current boundary(ies) may be manually edited or updated by selecting and retrieving one or a plurality of settings for similar boundaries and evaluating the results of said settings using a parallel process (that is, based on one or a plurality of metrics, recommendations from third-parties or a group, or by other means). Once set said new, updated or edited boundary may be tried, evaluated and reviewed then either replaced or edited as needed. FIG. 126: It is another object of the ARM to track the results of various boundary metrics and results in order to provide reporting of the effectiveness and success of various boundaries and/or their settings, so that others may find it quicker and easier to select the best available bounded realities for their various purposes and goals. Said tracked metrics may be used to provide optimization of boundaries so that evolution occurs and, over time, the most effective, successful and satisfying boundaries become dominant.

Figure 130:
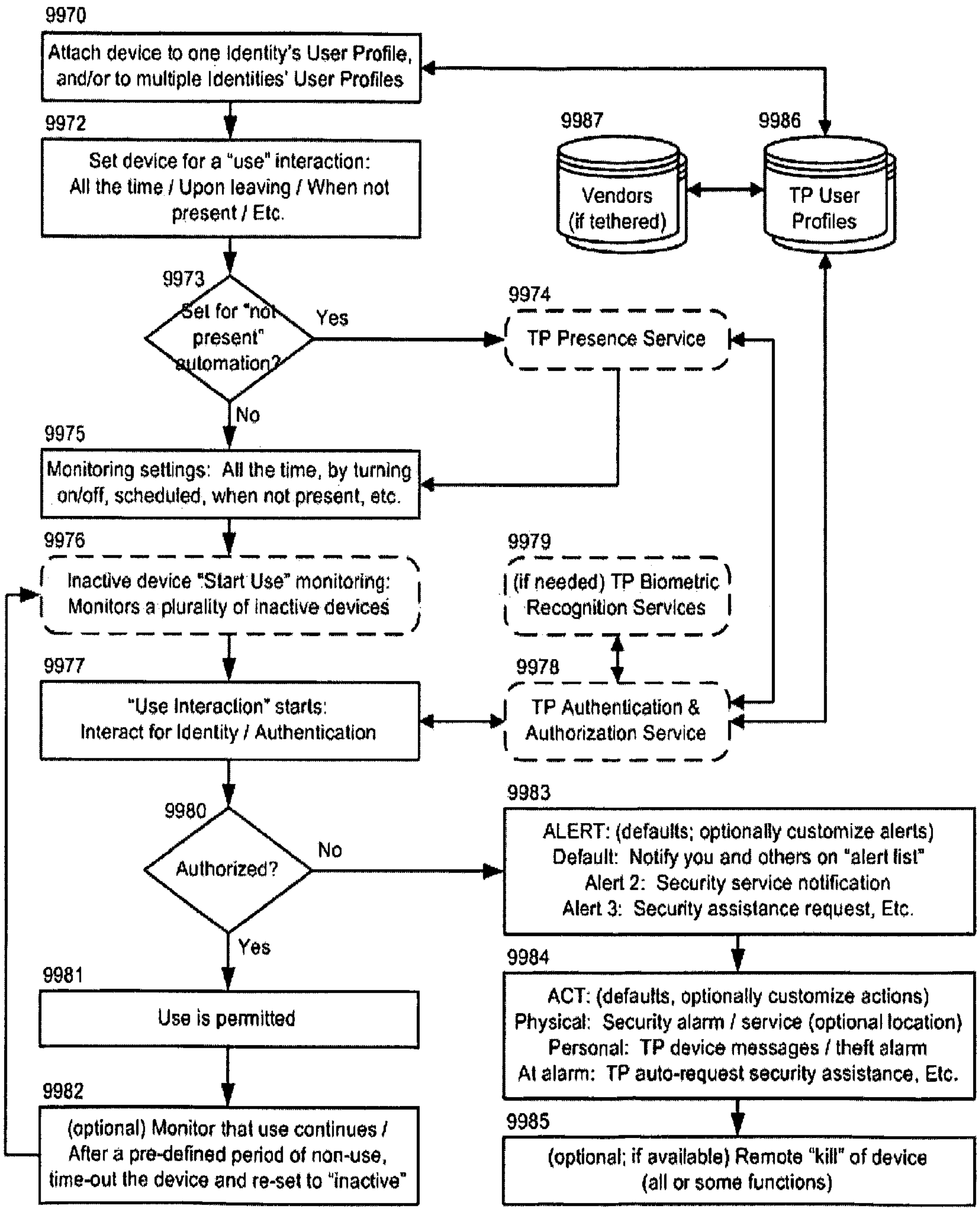

FIG. 130: It is another object of the ARM to provide means for physical property protection that includes automated monitoring and protection for physical places, networked electronic devices, and other types of property(ies) that may be networked by monitoring systems such as vehicles, equipment, luggage, etc.—essentially enhancing the current security industry to enable the possibility of a more "aware" and "trustable" environment due to enhanced and integrated physical protection and security.

Access to each SPLS's open or prioritized reality: Turning now to FIG. 90, "Access to Each SPLS's Open or Prioritized Reality" illustrates the Active Reality Machine (ARM) process at a high level. In some examples the ARM process is described by means of the devices, hardware, components and services starting from a range of types of Devices in Use. By means of these the ARM begins with a user 4180 4182 4184 who employs any of a range of devices such as an LTP 4181, an MTP 4181, an RTP 4183, an AID/AOD 4185, etc. which are employed to make outbound connections 4191 or to receive inbound connections 4192. Said Devices In Use 4181 4183 4185 are connected to TPN, hardware, servers, systems, etc. 4186, and by means of these components and services are used to create one or a plurality of identities 4187. For each identity 4187 one or a plurality of SPLS's is created 4188 either explicitly 4188, by making one or a plurality of outbound connections then adding them to an SPLS 4191, or by receiving one or a plurality of inbound connections and adding them to an SPLS 4192. For each SPLS boundaries may be set 4189 such as Paywalls, Priorities, Filters, Protection, etc. As one or a plurality of SPLS's is built 4188, including the boundaries desired for each 4189, each SPLS constitutes an "always on" alternate human reality with its own focus, priorities, exclusions, paywalls, etc. that may be employed for enjoying Shared Planetary Life Spaces connections that are both outbound 4191 and inbound 4192 by means of a range of Devices In Use 4181 4183 4185 for a user's 4180 4182 4184 plurality of identities 4187.

Devices: It is an object of the ARM for systematic use by multiple devices, in some examples Local Teleportals (LTP), Mobile Teleportals (MTP), Virtual Teleportals (VTP), Remote Teleportals (RTP), etc. It is also an object of the ARM to include IPTR (herein Identities, Places, Tools, Resources, etc.).

Illustration of Shared Spaces, Identities, Places, Tools, Resources: FIG. 91, "Summary of Shared Spaces: Identities, Places, Tools, Resources, Etc.," shows some examples in which a great deal is not called out. In FIG. 91 a user 4216 is logged in as one identity 4216 while employing three Local Teleportals simultaneously—Teleportal 1 4201, Teleportal 2 4202 and Teleportal 3 4203—as a single Device in Use 4200 (DIU). This is used in some examples a display 4200 to illustrate various IPTR (Identities, Places, Tools, Resources, etc.) that may be included in a single SPLS. Said IPTR in some examples includes: ARM Directory(ies) 4204; Shared Lives 4205 such as a teleconference with a group that is using a local Teleportal (LTP) to make their connection; Shared Lives 4206 such as a plurality of individual identities who are each connecting by means of an LTP (Local Teleportal), an MTP (Mobile Teleportal), a VTP (Virtual Teleportal on an AID/AOD [Alternate Input Device/Alternate Output Device], etc.; RCTP 4208 such as Remote Control Teleportaling (RCTP) of two computers, the first a local PC 4208, and the second a remote PC 4208; Web browsers 4209, in this case there are two Web browsers 4209 and each browser has multiple tabs open; in some examples if in a corporation one browser might be accessing internal corporate data and assets, while the second might access external websites and information; RCTP 4210 such as Remote Control via a Teleportal (RCTP) of two television set-top boxes (STB's) that include digital video recorders (DVR's) for immediate video access, the first a local STB/DVR 4210 and the second a remote STB/DVR 4210; Two different places via RTP's 4214.

In addition the combined LTP 4200 includes one or a plurality of TP Controls to select a user 4212, select one or a plurality of identities 4213, and within said selected identity (ies) then select one or a plurality of SPLS's 4211. Because there is sufficient screen real estate each of the three Local Teleportals contains a TP Control that lists SPLS's and individual IPTR (4207 at the bottom of Teleportal 1 4201, 4207 at the bottom of Teleportal 2 4202, and 4215 at the bottom of Teleportal 3 4203). The IPTR displayed 4204 4205 4206 4208 4209 4210 4214, the TP Controls 4212 4213 4211, the TP resources 4207 4215, as well as the simultaneous integration of the three Local Teleportals 4201 4202 4203 in a single combined Local Teleportal device 4200 4201 4202 4203 are each live and active in real time simultaneously. While this is a considerable range and scope for device processing, networking control and network bandwidth in some examples this is consistent with the Teleportal Device concepts described elsewhere.

In some examples each of the three Local Teleportals 4201 4202 4203 may operate as a separate Local Teleportals from each other. In this case each would have its own TP Controls (select user 4212, select identity 4213, select SPLS 4211) as well as its own set of preferred SPLS, identities, places, tools and resources 4207—and each would have its own IPTR displayed 4204 4205 4206 4208 4209 4210 4214 for its selected SPLS 4211. In some examples two of the Local Teleportals 4201 4202 may operate as a single integrated Local Teleportal. In this case these two integrated LTP's would have their own TP Controls 4212 4213 4211 as well as its own set of preferred SPLS and IPTR 4207—and these together would have their own IPTR displayed 4204 4205 4206 4208 4209 4210 4214 for its selected SPLS 4211. In some examples the third Local Teleportal 4203 may operate as a separate LTP with its own TP Controls 4212 4213 4211, its own set of preferred SPLS and IPTR 4207, and its IPTR 4204 4205 4206 4208 4209 4210 4214. Therefore, when there are a plurality of TP Devices they may be integrated together, combined in sub-combinations, or kept separate in any combination(s) or grouping(s) desired. Each separate or combined LTP provides the full functionality of a separate LTP, with the full range of IPTR uses simultaneously.

Figure 92A:
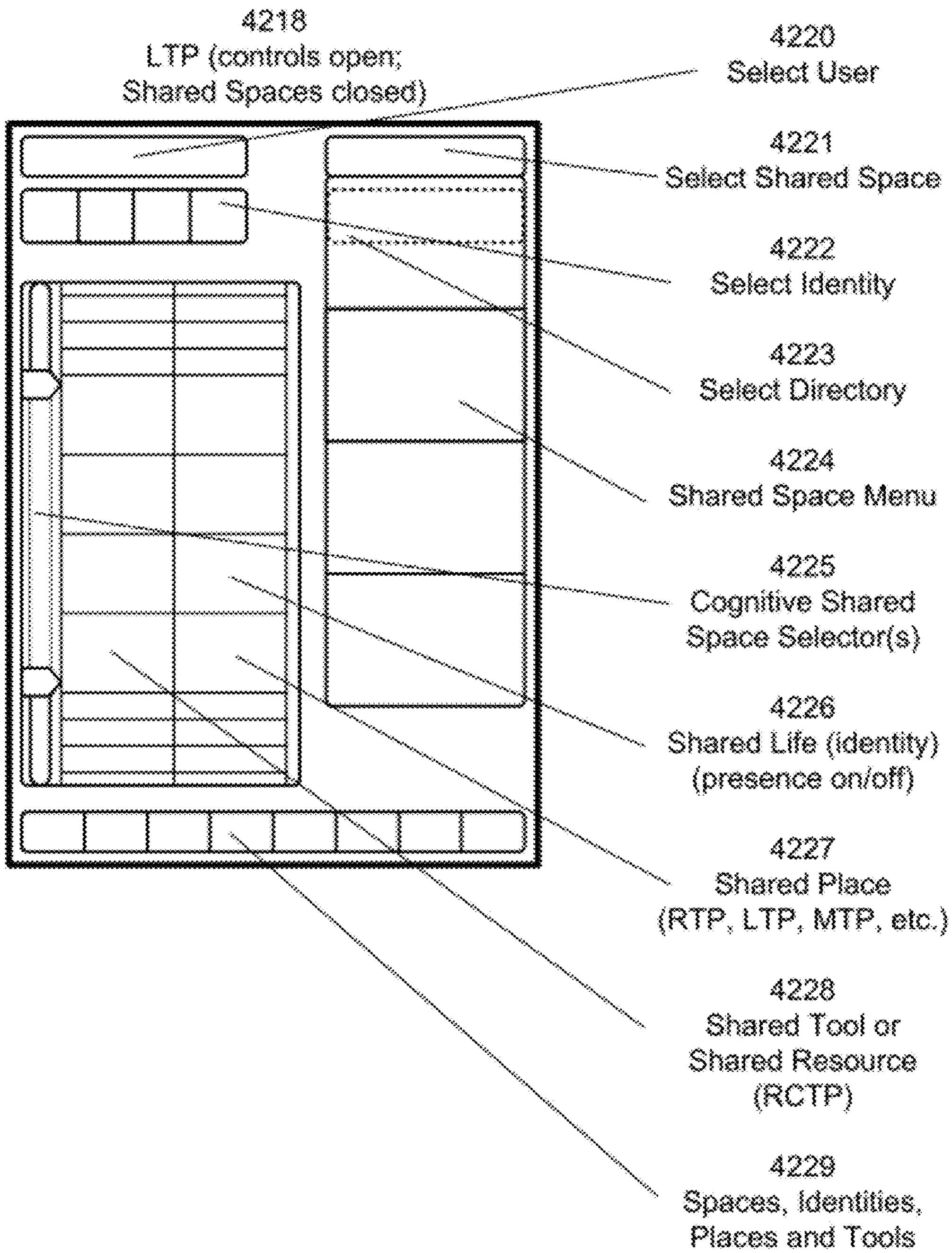
FIG. 92 is a pictorial diagram illustrating some examples of a Local Teleportal display.
Figure 92B:
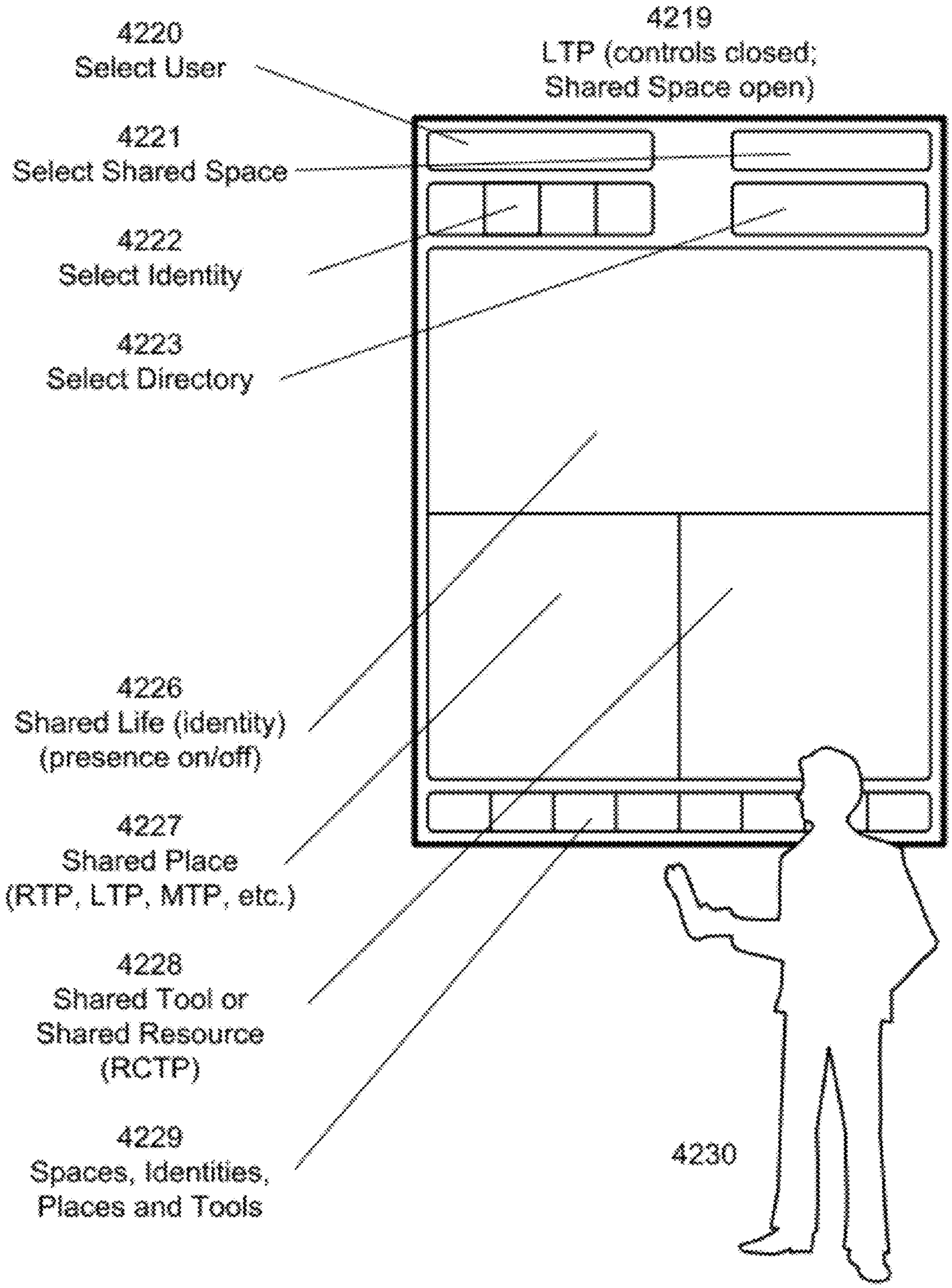

LTP Example Views: Turning now to FIG. 92, "Local Teleportal: Example Views," two views of the same LTP are illustrated. In the first view 4218 a number of navigation and selection controls are open, while shared spaces are being selected for opening. In the second view 4219 those navigation and selection controls are closed after use, and an SPLS is in use. These views begin with a user 4230 who is holding a remote in his hand to control the Teleportals, as well as using (optional) voice controls. The first displayed LTP control (in view 4218) selects the user 4220 because there may be more than one user of an LTP and each may have one or a plurality of identities, SPLS's, etc. Another LTP control selects one of a plurality of identities 4222 and a currently selected identity is highlighted. Another LTP control selects one or more of a plurality of SPLS's 4221 because an identity may have more than one SPLS associated with it, or it may be part of many others' SPLS's (whether they belong to individual identities or to groups). This Select Shared Space control 4221 is shown as opened in a Shared Spaces Menu 4224 wherein one of its SPLS's is highlighted for selection. Another LTP control is the Cognitive Shared Space Selector 4225 and it is used to select one or more of a plurality of IPTR 4225, such as a Shared Life (identities such as may be displayed by an LTP, MTP, VTP on an AID/AOD, etc.) 4226, a Shared Place (places such as may be displayed by an RTP, LTP, MTP, VTP on an AID/AOD, etc.) 4227, a Shared Tool or Shared Resource (such as a local or remote PC computer, or a local or remote television set-top box, etc. run by RCTP) 4228, etc. The Cognitive Shared Space Selector control 4225 provides varying levels of detailed views within one control by means of the slider indicators in the left control column 4225. The dark highlighted Center area in that column indicates the range of center items in the list that are expanded and displayed in full, while the items in the list above that expanded center zone are displayed as text labels only, and the items in the list below that expanded center's own are also displayed as text labels only. If the user needs to find and/or locate IPTR that is not listed in the SPLS, said user may employ one or more TP Directories 4223 (which is illustrated as a dotted line because it is hidden by the opened Shared Space Menu 4224). Another LTP control is a list of "recent" or "favorite" SPLS's and IPTR (Identities, Places, Tools, Resources, etc.) 4229—which depends on whether the user prefers a "history" setting (which displays recently used SPLS and IPTR) or prefers a "favorites" setting (which displays selected bookmarked SPLS and IPTR).

Turning now to the second view 4219 the LTP controls are closed and an SPLS is in use. Again, this view begins with a user 4230. The first closed LTP control displays the user selected 4220. Another closed LTP control displays a plurality of identities 4222 with the Identity In Use (IIU) highlighted. Another closed LTP displays the SPLS selected 4221. If the user needs to find and/or locate IPTR, the TP Directories control is available 4223. An open LTP control is the list of "recent" or "favorite" SPLS's and IPTR 4229. In this LTP 4219 the SPLS is in use and this is illustrated by including a Shared Life (identities such as may be displayed by an LTP, MTP, VTP on an AID/AOD, etc.) 4226, a Shared Place (places such as may be displayed by an RTP, LTP, MTP, VTP on an AID/AOD, etc.) 4227, and a Shared Tool or Shared Resource (such as a local or remote PC computer, or a local or remote television set-top box, etc. run by RCTP) 4228.

Many of the LTP controls 4222 4224 4226 4227 4228 4229 may be solely visual, a combination of visual and text, or text-only. In some examples these may be static photographic images that accurately depict what is selected. In some examples these may be real-time views of each identity, SPLS, IPTR, etc. In some examples these may be artistic depictions such as icons. In any of these cases text may be included with the image, or it may be displayed like a "tool tip" when an image has focus such as by being pointed at. In these controls audio is not included because multiple simultaneous audio sources cannot be comprehended, while multiple images are cognitively not a problem when the eye focuses on one image at a time.

Figure 93A:
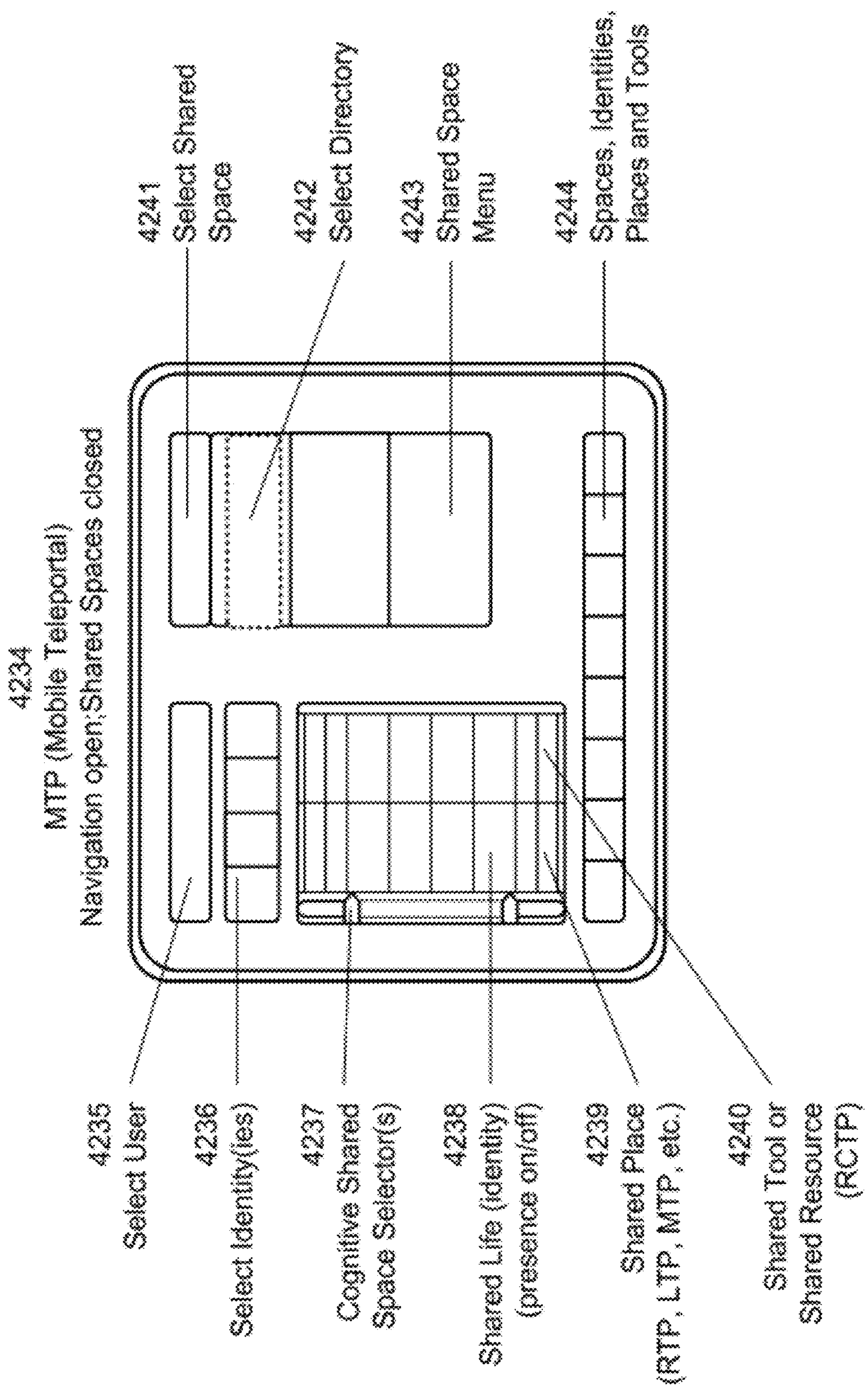
FIG. 93 is a pictorial diagram illustrating some examples of a Mobile Teleportal display.
Figure 93B:
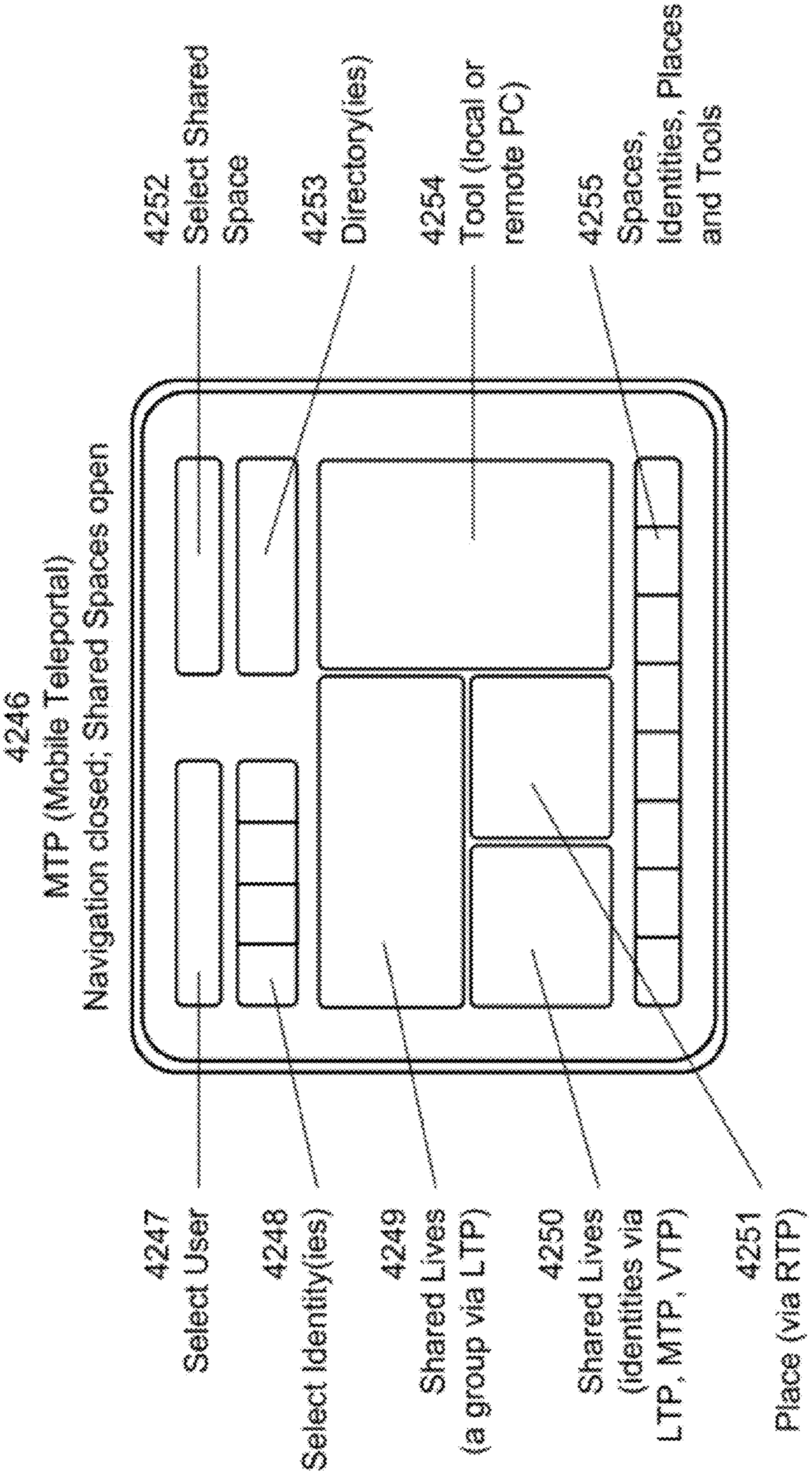

MTP Example Views: Turning now to FIG. 93, "Mobile Teleportal: Example Views," two views of the same MTP are illustrated. In the first view 4234 a number of navigation and selection controls are open, while shared spaces are being selected for focused presence. In the second view 4246 those navigation and selection controls are closed after use, and an SPLS is in use. In the first view 4234, the first displayed MTP control selects the user 4235 because there may be more than one user of an MTP and each may have one or a plurality of identities, SPLS's, etc. Another MTP control selects one of a plurality of identities 4236 and a currently selected identity is highlighted. Another MTP control selects one or more of a plurality of SPLS's 4241 because an identity may have more than one SPLS associated with it, or it may be part of many others' SPLS's (whether they belong to individual identities or to groups). This Select Shared Space control 4241 is shown as opened in a Shared Spaces Menu 4243 wherein one of its SPLS's is highlighted for selection. Another MTP control is the Cognitive Shared Space Selector 4237 and it is used to select one or more of a plurality of IPTR 4237, such as a Shared Life (identities such as may be displayed by an LTP, MTP, VTP on an AID/AOD, etc.) 4238, a Shared Place (places such as may be displayed by an RTP, LTP, MTP, VTP on an AID/AOD, etc.) 4239, a Shared Tool or Shared Resource (such as a local or remote PC computer, or a local or remote television set-top box, etc. run by RCTP) 4240, etc. The Cognitive Shared Space Selector control 4237 provides varying levels of detailed views within one control by means of the slider indicators in the left control column 4237. The dark highlighted Center area in that column indicates the range of center items in the list that are expanded and displayed in full, while the items in the list above that expanded center zone are displayed as text labels only, and the items in the list below that expanded center's own are also displayed as text labels only. If the user needs to find and/or locate IPTR that is not listed in the SPLS, said user may employ one or more TP Directories 4242 (which is illustrated as a dotted line because it is hidden by the opened Shared Space Menu 4243). Another LTP control is a list of "recent" or "favorite" SPLS's and IPTR (Identities, Places, Tools, Resources, etc.) 4244—which depends on whether the user prefers a "history" setting (which displays recently used SPLS and IPTR) or prefers a "favorites" setting (which displays selected bookmarked SPLS and IPTR).

Turning now to the second view 4246 the MTP controls are closed and an SPLS is in use. The first closed MTP control displays the user selected 4247. Another closed MTP control displays a plurality of identities 4248 with the Identity In Use (IIU) highlighted. Another closed MTP control displays the SPLS selected 4252. If the user needs to find and/or locate IPTR, the TP Directories control is available 4253. An open MTP control is the list of "recent" or "favorite" SPLS's and IPTR 4255. In this MTP 4246 the SPLS is in use and this is illustrated by including a Shared Life (identities such as may be displayed by an LTP, MTP, VTP on an AID/AOD, etc.) such as a group teleconference 4249 and an individual identity 4250, a Shared Place (places such as may be displayed by an RTP, LTP, MTP, VTP on an AID/AOD, etc.) 4251, and a Shared Tool or Shared Resource (such as a local or remote PC computer, or a local or remote television set-top box, etc. run by RCTP) 4254.

Many of the MTP controls 4236 4243 4238 4239 4240 4244 may be solely visual, a combination of visual and text, or text only. In some examples these may be static photographic images that accurately depict what is selected. In some examples these may be real-time views of each identity, SPLS, IPTR, etc. In some examples these may be artistic depictions such as icons. In any of these cases text may be included with the image, or it may be displayed like a "tool tip" when an image has focus such as by being pointed at. In these controls audio is not included because multiple simultaneous audio sources cannot be comprehended, while multiple images are cognitively not a problem when the eye focuses on one image at a time.

Figure 94A:
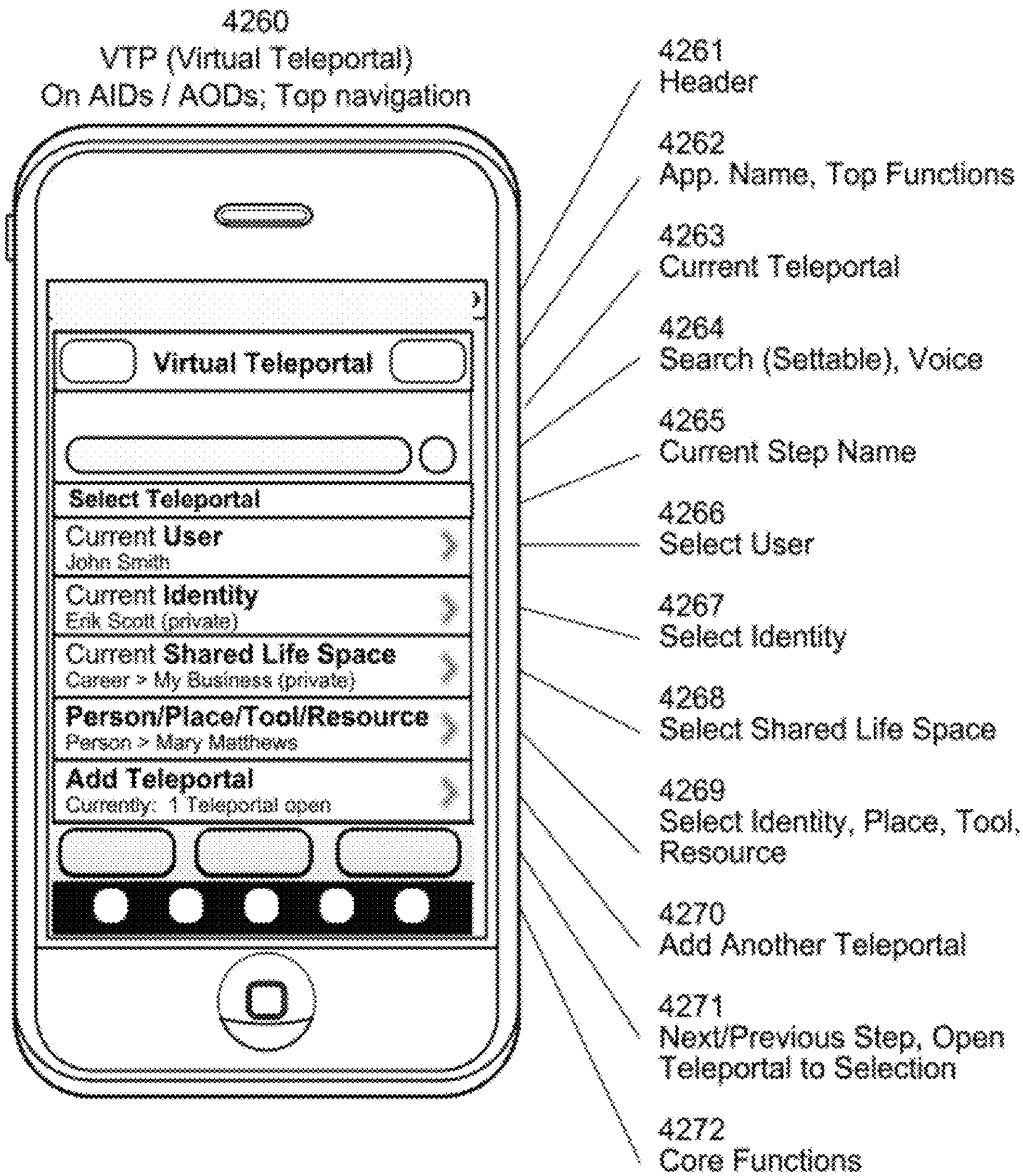
FIGS. 94 and 95 are a pictorial diagram illustrating some examples of a Virtual Teleportal display.
Figure 94B:
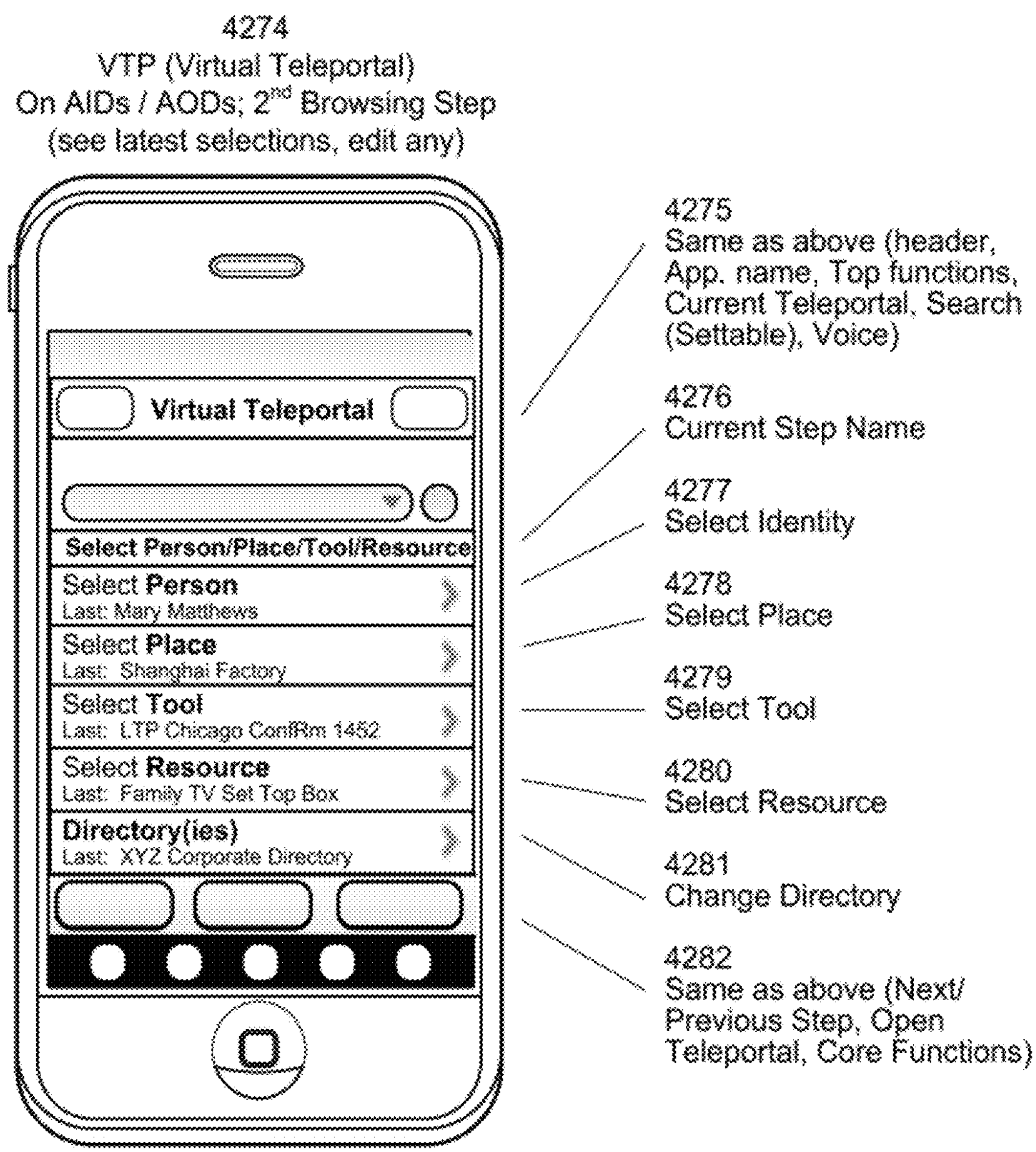
Figure 95:
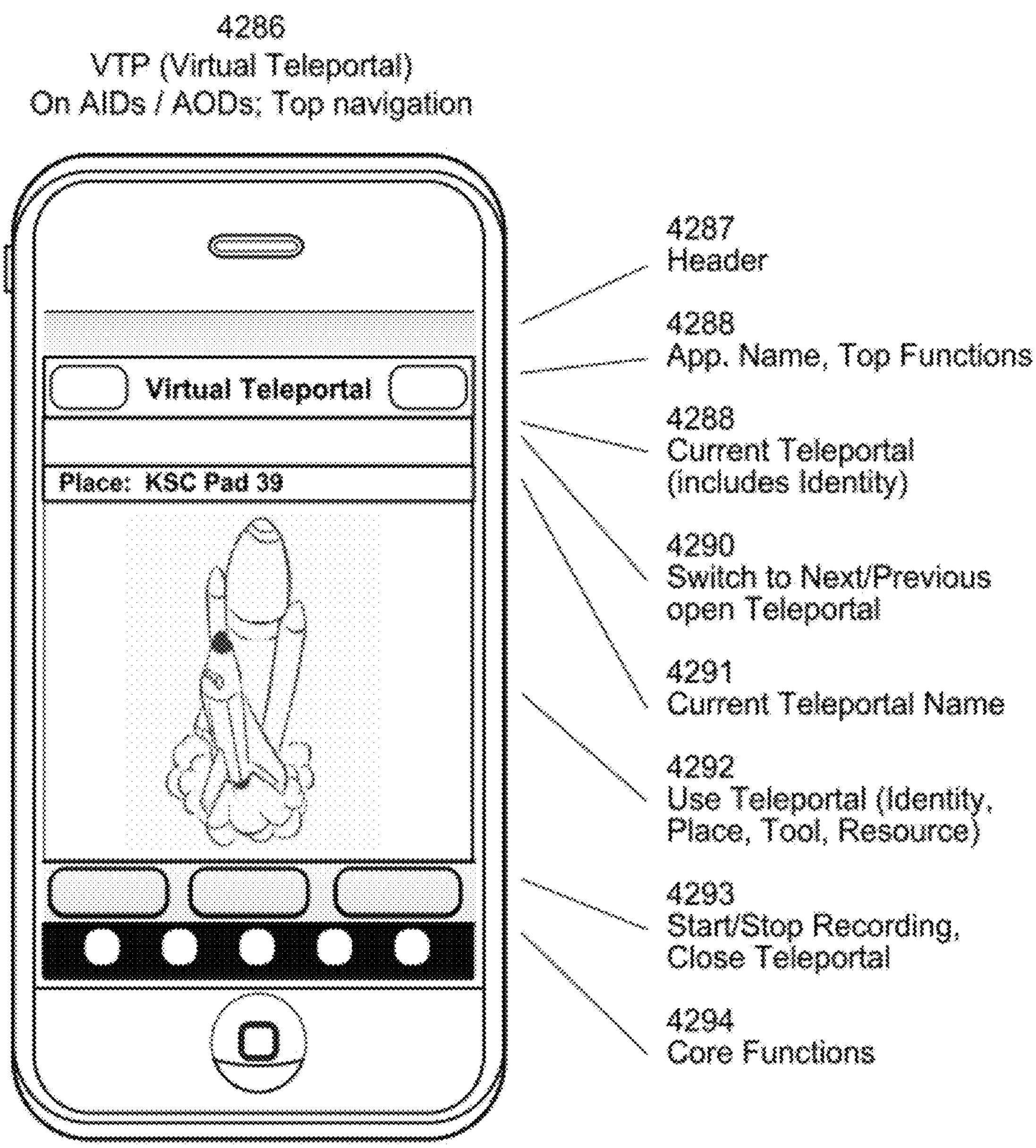

VTP Example Views: Turning now to FIGS. 94 and 95, "Mobile Teleportal: Example Views," three examples of views of the same VTP are illustrated. In the first 4260 a number of navigation and selection controls are open and being used at a high navigation level. In the second 4274 those navigation and selection controls are in use and nearly ready to make a specific IPTR selection. In the third 4286 those navigation and selection controls are closed after use, both an SPLS and IPTR have been selected, and a specific IPTR is in use. These three of varied examples illustrate some uses of a Virtual Teleportal (VTP) on an AID/AOD (Alternative Input Device/Alternative Output Devices), which in this illustration is an Apple iPhone.

One of the examples view 4260 shows navigation and selection controls. In this example view 4260, the iPhone standard header 4261 is displayed at the top. When the VTP is run at its top it displays the application name "Virtual Teleportal" 4262 and the appropriate top functions (as left and right buttons) 4262 for this area of the VTP (such as changing the VIP's settings). The next VTP component is to identify the current Teleportal 4263, which if this VTP has just been opened would default to the last Teleportal used—a connection between Eric Scott and Mary Matthews. The next VTP component is a Search field 4264 which in some examples would auto search that user's identities, SPLS's, IPTR, etc. but could also be set to search one or a plurality of ARM Directories. In some examples this Search field 4264 would not need to be set for Directory search and could automatically search both that user's identities, SPLS's, IPTR, etc. and ARM Directories in a single step. In addition, this Search 4264 may include voice-activated searching 4264 in the standard manner provided on the iPhone (as indicated by a small microphone icon). The next VTP component is to indicate the current step name 4266 which in this example is "Select Teleportal." The next VTP components include navigation selectors for selecting the user 4266, selecting an identity of that user 4267, selecting one or a plurality of SPLS's belonging to that identity 4268, selecting an IPTR within an open SPLS 4269, and adding an additional open Teleportal to the currently open Teleportal(s) 4270. In each of these navigation selectors 4266 4267 4268 4269 4270 both the selection name (such as Current User, Current Identity, Current Shared Life Space, Person/Place/Tools/Resource, Add Teleportal) and the most recently chosen selection under each is displayed. In this example the Current User is John Smith 4266; the Current Identity is "Eric Scott (private)" 4267 which is one of John Smith's private identities; the Current Shared Life Space is "Career>My Business (private)" 4268 which is a private business and its private SPLS; the Person/Place/Tool/Resource is "Person>Mary Matthews" 4269; and for Add Teleportal the current status is displayed which is "Currently: 1 Teleportal open" 4270. The next VTP component is a row of buttons that adds Wizard-like controls to the VTP. While navigation may be accomplished by the above selections (such as selecting the user 4266, identity 4267, SPLS 4268, IPTR 4269, etc.) it may also be accomplished by employing these three buttons for the next step 4271, the previous step 4271, or focusing on the specific VTP connection listed in the above selectors 4271. The bottom VTP component includes VTP core functions 4274 which in some examples include Favorites (SPLS's, IPTR, etc.), Recent (recently used VTP's), Contacts (a personal ARM Directory much like an address book), Connect ("always on" connections that may be entered immediately without needing any navigation), Messages (including both inbound messaging from others and outbound messages left for others), etc.

One of the examples view 4274 shows those navigation and selection controls being used to select a specific IPTR to open in this VTP. In some examples view 4274 the same VTP components are at the top 4275: the iPhone header 4275, the VTP application name 4275 with its top button functions 4275, the identification of the current or most recent Teleportal in use 4275, and Search 4275 (as described above). The next VTP component is to indicate the current step name 4276 which in this example is "Select Person/Place/Tools/Resource" (or IPTR as referred to herein). In this step 4276 selecting IPTR includes navigation selectors for selecting the person (or identity) 4277, selecting a place 4278, selecting a tool 4279, selecting a resource 4280, or changing the Directory 4281 and/or searching the currently selected Directory 4281 for a specific IPTR. In each of these navigation selectors 4277 4278 4279 4280 4281 both the selection name (such as Select Person, Select Place, Select Tool, Select Resource, Directory(ies)) and the most recently chosen selection under each is displayed. In this example the current Person is "Last: Mary Matthews" 4277, the current Place is "Last: Shanghai Factory" 4278, the current Tool is "Last: LTP Chicago Conference Room 1452" 4279, the current Resource is "Last: Family TV Set-Top Box" 4280, and the current Directory is "Last: XYZ Corporate Directory" 4281. In some examples view 4274 the same VTP components are at the bottom 4282: the row of three Previous/Next/Connect buttons that adds Wizard-like controls to the VTP 4282, and VTP core functions 4282 (which in some examples include Favorites, Recent, Contacts, Connect and Messages).

One of the examples view 4286 shows the VTP with a specific IPTR having been selected, while it is being viewed and used. In this example view 4286 the same VTP components are at the top including the iPhone's header 4287, the VTP application name 4288 with its top button functions 4288, and the identification of the current Teleportal in use 4288 (along with identifying the current Identity In Use) which is "Identity: Eric Scott, RTP>KSC Pad 39>Shuttle Launch". The next VTP component is the current step name 4291 which in this example is "Place: KSC Pad 39" (Where KSC Is an abbreviation for Kennedy Space Center). The next VTP component is the actual Teleportal In Use 4292 which in this case is a live space shuttle launch observed by means of a local RTP. Because an IPTR is in use 4292, the VTP buttons 4293 have changed and now provide immediate on-demand recording (with a Start Recording button 4293 and a Stop Recording button 4293), along with a button to terminate the Teleportal connection (the Close button 4293). The last VTP component is its core functions 4282 (which in some examples include Favorites, Recent, Contacts, Connect and Messages).

SHARED PLANETARY LIFE SPACES (SPLS) FOR IDENTITIES, PLACES, TOOLS, RESOURCES, ETC. (IPTR): The new digital environment has changed the definitions for many fundamental concepts such as a good education. When today's adults grew up there was no Internet. Before the Internet's immense, immediately accessible information and resources education was based on learning facts, remembering them and being able to use our stored personal knowledge independently. Today, even with a somewhat new and still developing Internet, those who know how to find information have access to far more than thousands of people could possibly learn and remember. In our digital era a new definition of a good education is the ability to interpret a situation, determine what information is needed, FIND IT RAPIDLY AND ACCURATELY, understand it (even if never seen before) and apply it effectively.

Just as digital technology has changed learning and education, it causes other fundamental changes in our view of the world as we transition to multiple new definitions that are not intuitive, clear or obvious. One new opportunity of this digital environment is to consider whether human presence might evolve from local physical presence to remote digital presence. If so, a new definition of human presence (the one illustrated here) is that many might find their remote digital presence becomes more important than their local physical presence—we can be present everywhere connected, all the time, including personal global observation and awareness as well as two-way visual interactivity. The door to this new definition that is illustrated here is by means of examples (herein named Shared Planetary Life Spaces" or SPLS's) which are "always on" and provide a new level of connectivity for more than today's people—SPLS(s) includes individuals who may have a plurality of identities, groups, places, tools, resources, etc. as immediate "always on" connections.

Consider some examples such as from corporate operations. A global company's processes and operations may be transformed by having a range of Shared Planetary Life Spaces, with one or a plurality of SPLS's for each operating area. In its internal operations, each company has core functions that may each have its own separate SPLS. For one area like finance or human resources, each SPLS puts all of that area's people (identities), places, tools and resources (IPTR) into a single "always connected" Shared Space. Thus, a company's entire human resources team, or finance team, or sales organization, or R&D (research and development) teams, or any functional area may have "always on" complete personal connections 24×7×365 even though they are spread over multiple continents and in multiple time zones. Across the company its internal directory may now be the door to a broad internal SPLS that instantly includes every employee from any geographic location, function and level with anyone else. Similarly, the company's suppliers, distributors, retailers, sales agents, third-party service companies, etc. might also be parts of "always on" SPLS's so they are able to constantly work together with every appropriate company employee, regardless of their location. Just as important, EXTERNAL SPLS's may be useful to the company's customers by having one or a plurality of SPLS's within which customers and the company remain fully connected with each other 24×7×365—with customers (optionally) connected to each other everywhere/all the time, as well as the company knowing their customers' needs better then at any time before in history, and able to connect with its sales prospects better also. Similarly, a public SPLS that includes the company's prospects may provide every company the ability to work directly and immediately with each significant purchase/sales opportunity no matter where it is located.

The five figures in this section (FIGS. 96, 97, 98, 99 and 100) describe the process of having connections that are "always on" and "everywhere" by means of a plurality of varied SPLS's based upon whether you are a public identity (including a current person), a private or secret identity, a group (such as a corporation or organization), or the public.

Figure 96:
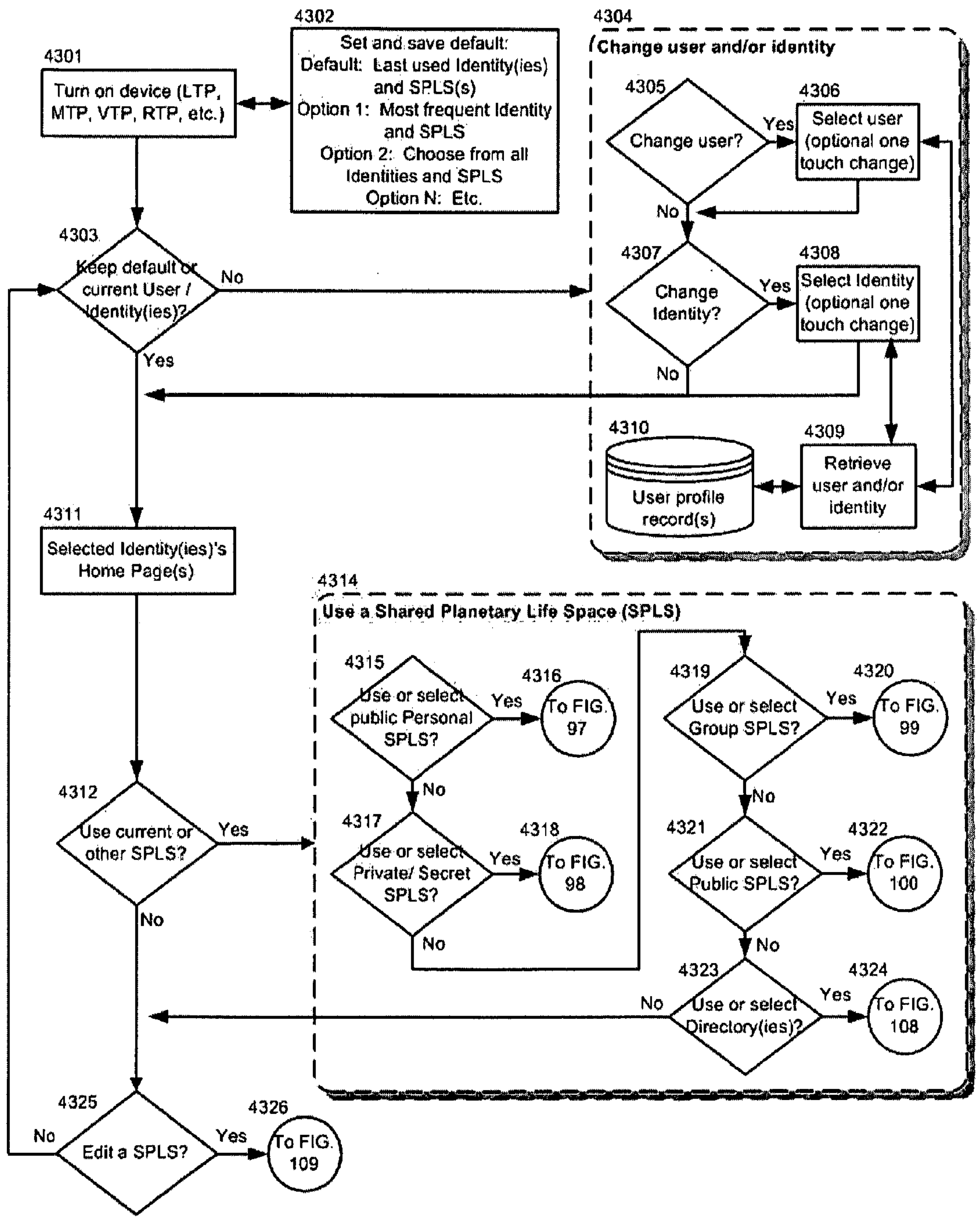
FIG. 96 is a flow chart showing some examples of procedures for selecting an identity and/or an SPLS (Shared Planetary Life Space).

Shared spaces selections: Turning now to FIG. 96, "Shared Spaces Selections: Summary," in some examples by turning on a TP device 4301 such as an LTP, MTP, VTP, etc. In this example, the default setting is for the device to turn on set to the last used identity(ies) and SPLS(s) 4302. In some examples the default could be for the device to be set to turn on with the most frequent identity and SPLS(s) 4302. In some examples the default could be set to turn on and allow its user to choose one or a plurality of identities from the available identities and/or SPLS(s) 4302. In each case, the TP device permits the user to set and save its default state 4302. In some examples the user may decide to keep or change the device's current user(s) 4303 and/or identity(ies) 4303 (which may herein be referred to as "user" or "users"). If the user decides to change the identity 4304 than this may include keeping or changing the current user 4305, and if a change is desired selecting a different user 4306 such as by means of an (optional) one touch change 4306. This is accomplished by retrieving and loading the alternative user(s) 4309 from the appropriate locally stored and/or remotely stored user profile records 4310. Next the identity may be kept or changed 4307 and this includes changing to any public, private and/or secret identity(ies). If there is a decision to change the identity 4307 and if a change is desired selecting a different identity 4308 such as by means of an (optional) one touch change 4308. This is accomplished by retrieving and loading the alternative identity(ies) 4309 from the appropriate locally stored and/or remotely stored user profile records 4310. In some examples these changes in the user 4305 4306 4309 4310 and changes in the identity 4307 4308 4309 4310 may utilize a similar and parallel interface to each other, and this changed user 4305 4306 or changed identity 4307 4308 may use the device 4311. Alternatively, the initially set user and identity 4301 4302 may be kept 4303 and employed to use the device 4311. Next the standard interface such as a device homepage is displayed for use 4311, which permits the use of the current SPLS 4312 or changing it to a different SPLS 4312. Whether kept or changed 4312 an SPLS is used 4314 such as a public identity's SPLS 4315, a private/secret identity's SPLS 4317, a group's SPLS 4319, a public SPLS, or a Directory(ies) 4323. In each of these cases, a reusable connection process is followed such as in some examples: If a public identity's SPLS 4315 is used then continue the "always on" connection process in FIG. 97 4316. If a private/secret identity's SPLS 4317 is used then continue the "always on" connection process in FIG. 98 4318. If a group's SPLS 4319 is used then continue the "always on" connection process in FIG. 99 4320. If a public SPLS 4321 is used then continue the connection process in FIG. 1004322. If a new connection needs to be made then some examples use a Directory 4323 that includes the IPTR to be selected and continue that selection in FIG. 1084324.

As described above for changing the user and/or identity selected 4304 4305 4306 4307 4308 4309 4310, if the user decides to change the SPLS 4312 than this includes selecting a different SPLS 4314 4315 4317 4319 4321 or Directory 4323 such as by means of an (optional) one touch change 4335. In some examples if one or a plurality of SPLS(s) needs to be edited 4325, updated 4325, etc. then continue sad editing/updating process in FIG. 109 4326.

Figure 97:
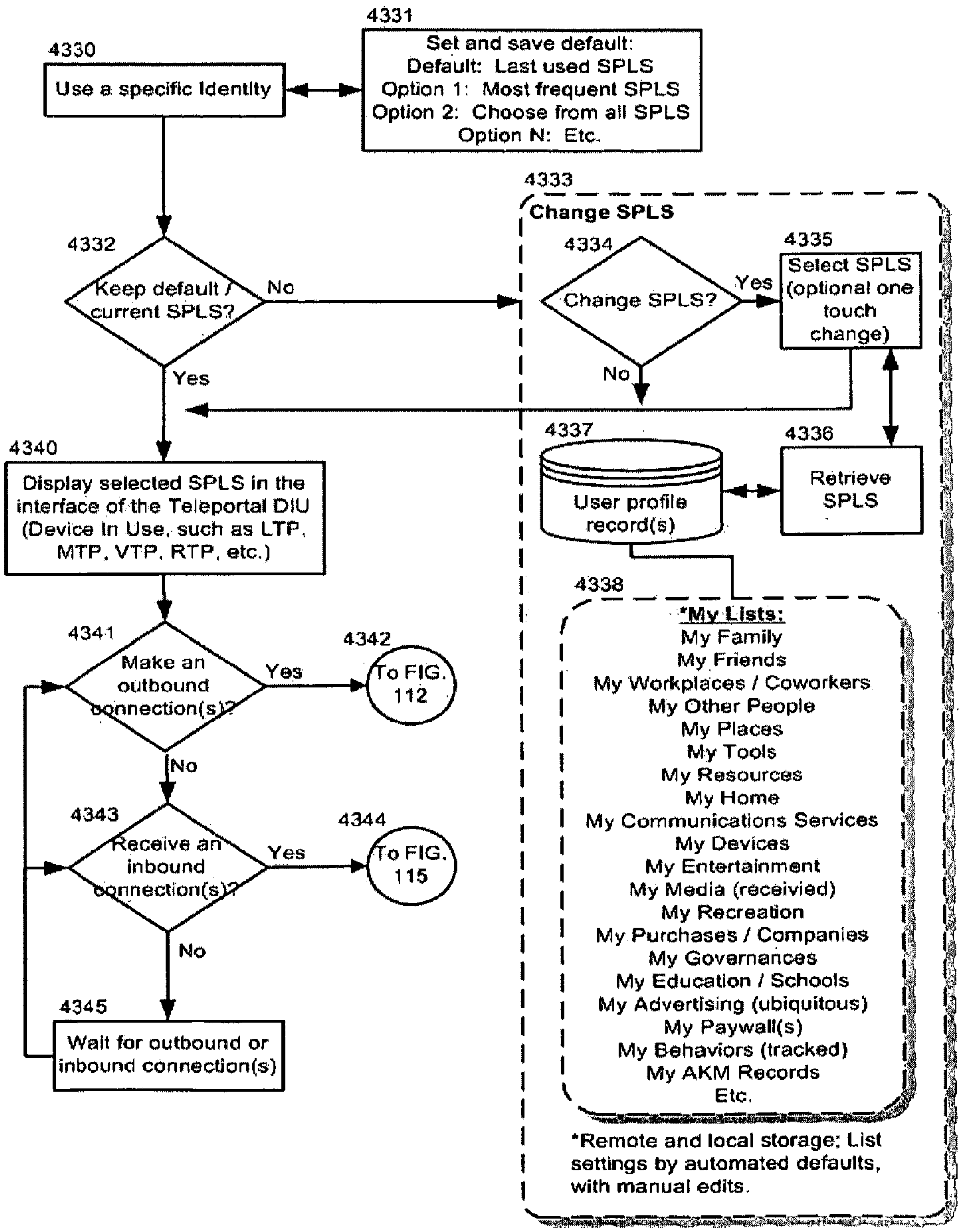
FIG. 97 is a flow chart showing some examples of procedures for an identity's SPLS services.

TPU individuals' services—public identities: FIG. 97 illustrates some examples of a public identity(ies) accessing "always on" SPLS's connections. By means of a TP DIU (Device In Use, such as an LTP, MTP, VTP, RTP, etc.), when an identity is used 4330 the default is for the identity to be set to the last used SPLS(s) 4331. In some examples the default could be for the identity to be set to the most frequently used SPLS(s) 4331. In some examples the default could be for the identity to be set to allow choosing from the available SPLS (s) 4331. In each case, the current identity may set and save its default state 4331. The user may decide to keep or change the current SPLS(s) 4332. If the user decides to change the SPLS 4333 4334 than this includes selecting a different SPLS 4335 such as by means of an (optional) one touch change 4335. This is accomplished by retrieving and loading the alternative SPLS(s) 4336 from the appropriate locally stored and/or remotely stored user profile records 4337. The available connections in and SPLS may be locally stored and/or remotely stored in any of a variety of "lists" or formats 4338 such as address books 4338, contact lists 4338, bookmarks 4338, favorites 4338, a personal home page 4338, a personal portal 4338, etc. The entry of items in said list may be automated and/or manual as described elsewhere. Regardless of the list type(s) and/or format(s) 4338, these may include a wide range of categories and items such as: My Family 4338, My Friends 4338, My Workplaces/Co-Workers 4338, My Other People 4338, My Places 4338, My Tools 4338, My Resources 4338, My Home 4338, My Communications Services 4338, My Devices 4338, My Entertainment 4338, My Media 4338, My Recreation 4338, My Purchases/My Brands and Companies 4338, My Governances 4338, My Education/Schools 4338, My Advertising 4338, My Paywalls 4338, My Behaviors 4338 (tracked), My AKM Records 4338, Etc.

In some examples these changes in the SPLS 4333 4334 4335 4336 4337 may utilize a similar and parallel interface to selections such as changing the user(s) 4304 and/or changing the identity(ies) 4304. Alternatively, the initially set SPLS may be kept 4332 and employed for one or a plurality of "always on" connections that begin by displaying the selected SPLS in the interface of the TP DIU 4340 (Device In Use, such as an LTP, MTP, VTP, RTP, etc.). To make an outbound connection 4341 an IPTR is selected from the current SPLS (s) and it is immediately displayed in an "always on" connection, though the connection process includes reusable connection steps such as those that continue in subsequent FIG. 112 4342. To receive an inbound connection 4343 the connection process includes reusable connection steps such as those that continue in subsequent FIG. 115 4344. If no outbound connection 4341 nor inbound connection 4343 are made, then the TP DIU waits for said connection events 4345.

Figure 98:
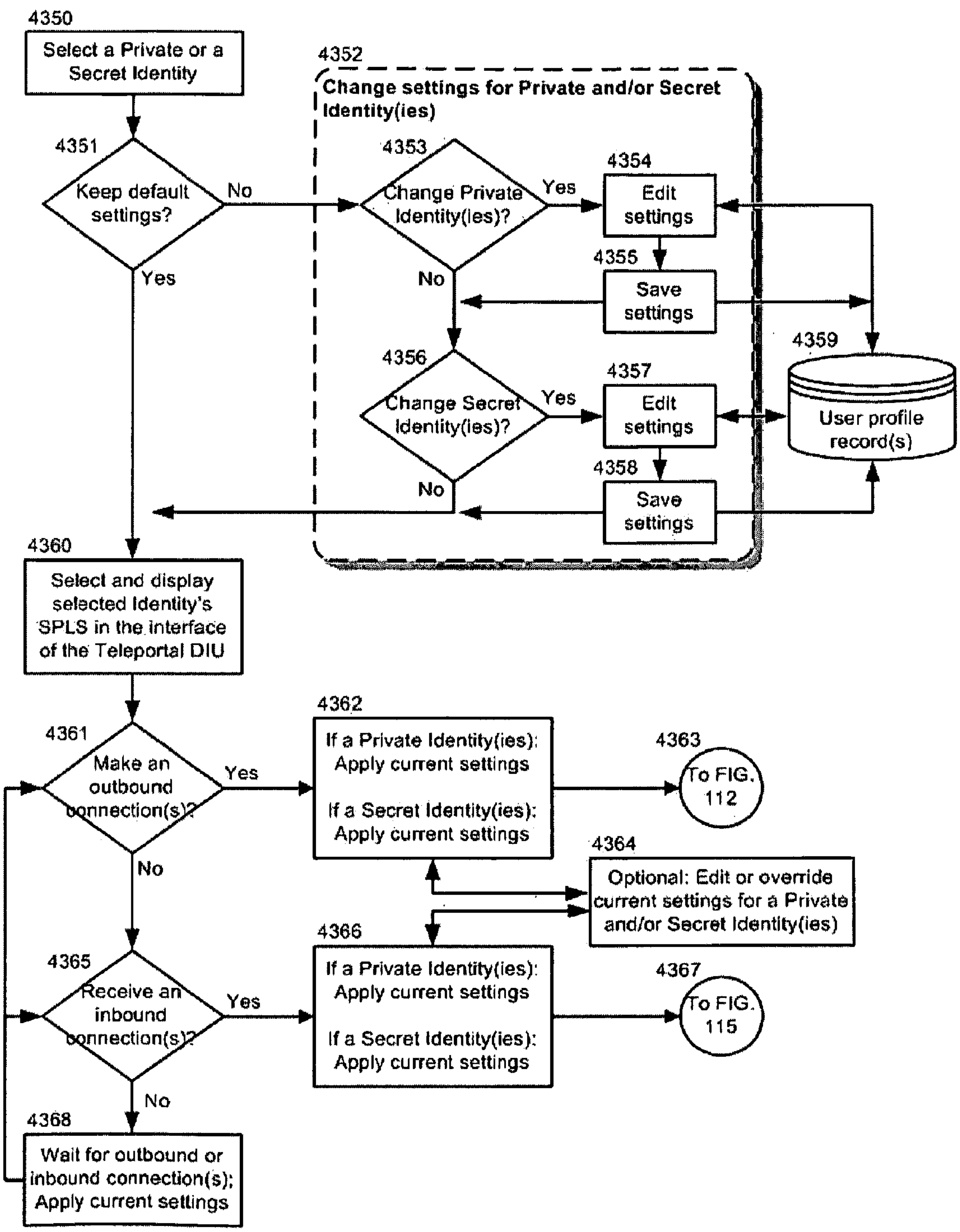
FIG. 98 is a flow chart showing some examples of procedures for a private identity(ies) and/or a secret identity(ies) SPLS services.

TPU individuals' services—private and secret identities: FIG. 98 illustrates some examples of a private and/or secret identity accessing "always on" SPLS's connections. By means of a TP DIU (Device In Use, such as an LTP, MTP, VTP, RTP, etc.), when a private and/or secret identity is used 4350 the default is for the identity to be set to the last used default and SPLS(s) settings 4351. In some examples the default could be changed 4352. If changed, the normal default PRIVATE identity settings include (1) outbound connections to anyone chosen (whether in an SPLS, from a directory, etc.), (2) inbound connections are permitted only from that identity's SPLS's, (3) silent non-response to inbound connection requests (complete stealth mode with no acknowledgment of existence to anyone for any reason), (4) any settings edits deemed appropriate. If the private identity settings are changed 4351 4352 4353 then the settings are displayed and edited 4354 saved 4355 to that identity's user profile records 4359 (which may be located either locally and/or remotely). Regardless of whether the private identity settings are kept or changed 4353, the user may also choose to change the default settings for a secret identity. If changed, the normal default SECRETS identity settings include (1) outbound connections to anyone chosen (whether in an SPLS, from a directory, etc.), (2) silent non-response to all inbound connection requests (completes stealth mode with no acknowledgment of existence to anyone for any reason), (3) only anonymous transactions conducted by a trusted third-party who protects the secret identity, such as via a Fiduciary, (4) any settings edits deemed appropriate. If the secret identity settings are changed 4351 4352 4356 then the settings are displayed and edited 4357 saved 4358 to that identity's user profile records 4359 (which may be located either locally and/or remotely). In some examples these changes in the private identity's settings 4351 4352 4353 and/or changes in the secret identity's settings 4351 4352 4356 may utilize a similar and parallel interface to each other, and this changed private identity 4355 4359 or changed secret identity 4358 4359 may use the TP Device 4360. Alternatively, the initially set private identity and/or secret identity 4350 may be kept 4351 and employed to use the device 4360. In either of these cases the selected identity's SPLS is displayed 4360 for use, and said SPLS may be changed by means such as 4332 4333 in FIG. 97. Whether kept or changed 4312 an SPLS is used 4360.

To make an outbound connection 4361 an IPTR is selected from the current SPLS(s). If this is an outbound focused connection for a private identity then apply the current private identity's settings 4362, and display the focused connection as "always on," though the connection process includes reusable connection steps such as those that continue in subsequent FIG. 112 4363. If this is an outbound focused connection for a secret identity then apply the current secret identity's settings 4362, and immediately display the focused connection as "always on," though the connection process includes reusable connection steps such as those that continue in subsequent FIG. 112 4363. To receive an inbound connection 4365 for a private identity then apply the current private identity's settings 4366, and if the inbound requestor is included in the current SPLS (and the current SPLS settings are to accept inbound connections from those in the current private identity's SPLS) 4366, then immediately display the focused connection as "always on," though the connection process includes reusable connection steps such as those that continue in subsequent FIG. 115 4367. Inbound connections 4365 for a secret identity may apply the current secret identity's settings 4366, and if the current SPLS settings are to reject all inbound connections, not acknowledge them and stay in stealth mode, then these inbound connections will be rejected completely 4366 and no connection will be made. If no outbound connection 4361 nor inbound connection 4365 are made, then the TP DIU waits for said connection events 4368.

TPU groups' services—public, private and secret identities: As described above, groups and organizations (such as corporations, charities, foundations, government agencies, small businesses, etc.) may have many uses for SPLS's. These include external "always on" connection with prospects, customers, clients, etc. They also include internal functional-level SPLS's in each of their core operations such as a business unit, marketing, shipping, distribution, human resources, and a plurality of functional and operational groups. Finally, they also include quasi-private SPLS's in their channel such as with retailers, resellers, partners, distributors, warehouses, etc. and quasi-private SPLS is with stakeholders such as corporate boards, regulatory agencies, legal counsel, realtors helping acquire or sell properties, etc. As a result of this potentially large number of SPLS's in a single group such as a large corporation, charity, government agency, etc. the ability to rapidly move between a plurality of IPTR in a plurality of SPLS's is a key to their usability.

Figure 99:
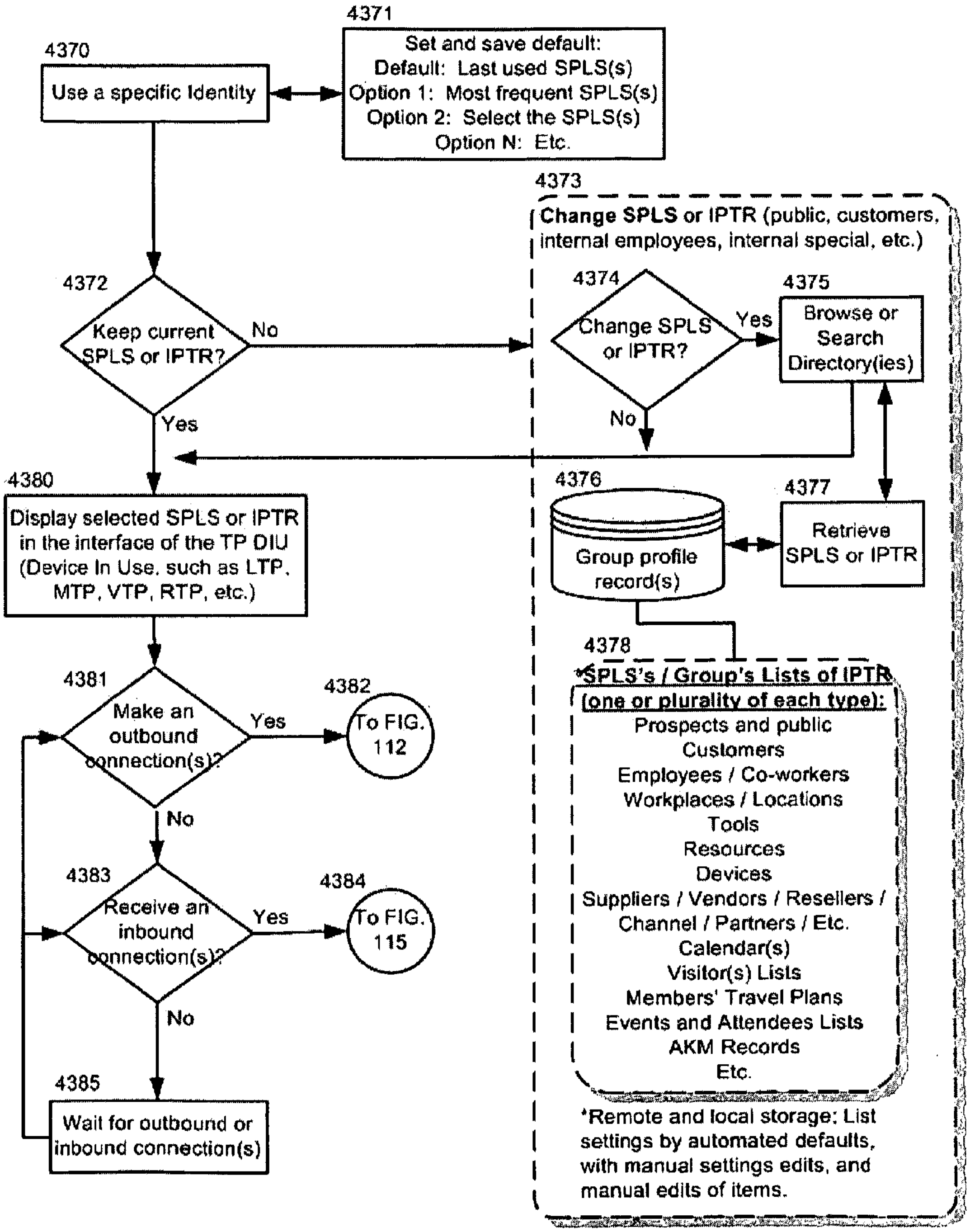
FIG. 99 is a flow chart showing some examples of procedures for groups' SPLS services, whether for their members' public, private and/or secret identities.

Turning now to FIG. 99, "ARM Groups' Services—Public, Private and Secret Identities," each member of a group and uses a recognized and authorized identity 4370. The default is for the identity to be set to the last used SPLS(s) 4371. In some examples the default could be for the identity to be set to the most frequently used SPLS(s) 4371. In some examples the default could be for the identity to be set to allow choosing from the available SPLS(s) 4371. In each case, each identity may set and save its default state 4371. The user may decide to keep or change the current SPLS(s) 4372 or IPTR. If the user decides to change the SPLS or IPTR 4373 4374 than this includes selecting a different SPLS 4375 or IPTR 4375 by means such as browsing 4375, searching one or a plurality of Directory(ies) 4375, etc. 4375. In addition, the selection interface may include the (optional) one touch interface change described previously. This is accomplished by retrieving and loading the alternative SPLS(s) 4377 or IPTR 4377 from the appropriate locally stored and/or remotely stored group profile records 4376. The available connections in and SPLS may be locally stored and/or remotely stored in any of a variety of "lists" or formats 4378 such as directories 4378, contact lists 4378, a portal 4378, bookmarks 4378, favorites 4378, etc. The entry of items in said list may be automated and/or manual as described elsewhere. Regardless of the list type(s) and/or format(s) 4378, these may include a wide range of categories and items such as: Prospects and public 4378, Customers 4378, Employees/Co-Workers 4378, Workplaces/Locations 4378, Tools 4378, Resources 4378, Devices 4378, Suppliers/Vendors/Resellers/Channel//Resellers/Distributors/Partners/Etc. 4378, Calendar(s) 4378, Visitor(s) Lists 4378, Members' Travel Plans 4378, Event's end Attendees Lists 4378, Individuals' and Group's AKM Records, Etc.

In some examples the SPLS and/or IPTR may be changed 4372 4373 4374 4375 4377 4376 4378. Alternatively, the initially set SPLS may be kept 4372 and employed for one or a plurality of "always on" connections that begin by displaying the selected SPLS in the interface of the TP DIU 4380 (Device In Use, such as an LTP, MTP, VTP, RTP, etc.). To make an outbound connection 4381 an IPTR is selected from a current SPLS(s) and it is immediately displayed in an "always on" connection, though the connection process includes reusable connection steps such as those that continue in subsequent FIG. 112 4382. To receive an inbound connection 4383 the connection process includes reusable connection steps such as those that continue in subsequent FIG. 115 4384. If no outbound connection 4381 nor inbound connection 4383 are made, then the TP DIU waits for said connection events 4385.

Figure 100:
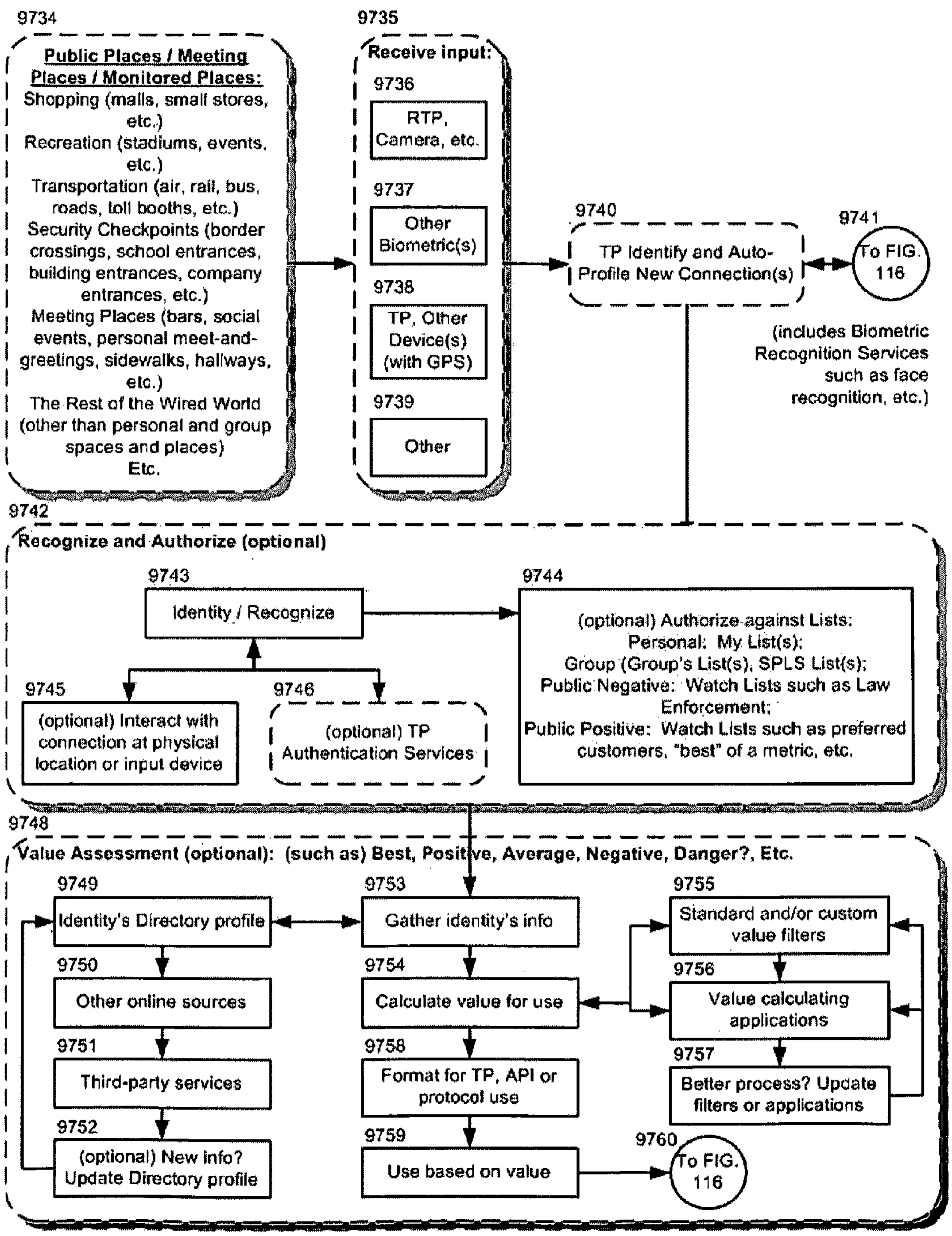
FIG. 100 is a flow chart showing some examples of procedures for public SPLS services.

TPU public's services—public services: A public SPLS is different because of its openness and its integration with physical locations. As illustrated in FIG. 100, "ARM Public's Services," some location uses include public places 9734, meeting places 9734, monitored places 9734, etc. In turn, these may include locations such as shopping (malls, free-standing stores, small stores, etc.) 9734, transportation (air, rail, bus, roads, tollbooths, etc.) 9734, security checkpoints (border crossings, school entrances, building entrances, company entrances, stadium entrances, etc.) 9734, recreation (ticketed stadiums and arenas, ticketed events, school and kids' sports activities, neighborhood playgrounds, etc.) 9734, meeting places (bars, social events, personal meet-and-greets, etc.) 9734, public spaces (sidewalks, parks, crowds, stadiums, frequently graffiti'd walls, public parking garages, etc.) 9734, other wired and connected locations (incoming Teleportal connection requests, online photos and videos, pictures of people on websites and in the news, etc.) 9734, Etc.

Depending on the types of inputs available in each source, physical location, ticketed event, social activity, public space, etc. input is received 9735 such as from an RTP 9736, cameras 9736 (including cameras in TP devices, personal photo and video cameras that can connect online, security cameras, etc.), other biometric inputs 9737, TP Devices that are present locally 9738 (including one or a plurality of LTP, MTP, VTP, RTP, etc.), other devices 9738 (such as mobile phones, devices with GPS, etc.), logins such as security badges 9739, and a plurality of types of inputs that can be used to provide recognition 9739. These data are provided to local and/or remote TP Identify and Auto-Profile New Connections 9740, which is illustrated in FIG. 116 9741. In some examples this includes components that help differentiate this from other systems: recognizing and authorizing (which may be done optionally) 9742, and auto-classifying one or a plurality of those identified (which may be done optionally) 9748.

The first of these components is recognition and authorization 9742 which begins by utilizing input received 9735 to identify and recognize 9743 specific IPTR (especially identities). The accuracy and visibility of these may be enhanced by (optionally) interacting with the identity being identified 9745, if the device or connection that provides input is capable of two-way interactions. In addition, security may be enhanced by (optionally) utilizing TP Authentication Services 9746. The protection services of the TP ARM 9744 may (optionally) be utilized by authorizing said identified IPTR against available authorized lists such as SPLS's. In some examples those who want to physically or digitally enter one's home or personal space may be authorized against one's identity's SPLS's "My Lists" to permit immediate entry or to determine if a different type of action might be needed. In some examples a group's available authorized lists, such as its SPLS's, may be used to check recognized identities and either permit physical/digital entry or take another action such as block it, request further information, protect against it, etc. In some examples in various public events and spaces identified individuals may be checked against law enforcement lists such as determining if there is a dangerous individual at a ticketed sporting event or in a bar where heavy drinking is going on, if there is a potential shoplifter in a jewelry store, if a known sexual predator is hanging around a children's playground, etc. In some examples positive and preferred members of the public may be identified and treated specially such as preferred customers who enter a physical store, friends who appear unexpectedly in one's personal or group (physical or digital) space, unrecognized stakeholders or dignitaries who should receive special treatment, etc.

In some examples the second of these components is how these identified IPTR (in some examples identities) may be (optionally) auto-classified 9748. Various types of classification are possible and some are described elsewhere such as best (top 25%)/average (middle 50%)/lowest (bottom 25%), quintiles such as best/positive/average/negative/danger?, etc. Auto-classification begins by using the recognized identity 9742 9743 and gathering that identity's information 9753. Said information gathering may be done by accessing that identity's Directory(ies) profile(s) 9749, accessing online sources 9750, accessing third-party services 9751, etc. As part of gathering information from various sources, as an additional process, it is possible to use any new information learned 9752 to update that identity's Directory(ies) profile(s) 9749. After the appropriate information has been gathered 9753 9749 9750 9751 then an auto-classification may be performed 9754 by performing a comparison or calculation such as calculating said identity's value for a specific goal. Means for these comparisons, calculations, value assessments, etc. may include standard and/or custom value filters 9755 (like a retail chain or store might apply to determine its best or preferred customers, or as a professional services firm might apply to determine employees of its current client companies, etc.), value calculating applications 9756 (like a government revenue service might apply to every citizen to estimate its potential financial collections and compare that against the actual tracked income received from each identity, etc.), etc. As part of applying standard and custom value filters 9755 and/or running value calculating applications 9756, if a better process can be determined 9757 then said filters 9755 and/or said value calculations 9756 may be determined, updated and improved 9757.

After an identity has been recognized 9742 9743 9745 9746 and (optionally) authorized 9744, and after the identity's information has been gathered 9753 9749 9750 9751 and an (optional) auto-classification performed 9754 9755 9756—many of which steps are optional and can be skipped if desired or if needed—said data is formatted for TP use 9758, API access 9758, protocol-based access 9758 etc. then said formatted identity information, valuation and/or classification may be used and applied based upon the identity's calculated value 9759. Said process of calculating and using these information continues in FIG. 116 9760.

ARM DIRECTORY(IES)—ARCHITECTURE, PROCESSES, DATA, ADD/EDIT, SEARCHING/BROWSING/SELECTING, CONNECTING TO IPTR, REPORTING AND RECOMMENDATIONS, ETC.: One element of Shared Planetary Life Spaces (SPLS's) is an underlying Directory(ies) component/system/facility that accumulates, stores and maintain the information necessary to enable the IPTR in SPLS's, to interact as needed, such as providing the data to determine presence, establish and keep current connections, etc. between two or a plurality of IPTR.

ARM DIRECTORY(IES)—SUMMARY: Turning now to FIG. 101, "ARM Directory—Summary," this illustrates this facility's architecture and functionality. From the user's viewpoint it's functions, services and applications 4401 which include features such as browsing 4401 multiple levels and categories, searching 4401 that includes global as well as specialized searches, editing/managing profiles 4401 as well as preferences, data, etc. Illustrations of these levels include worldwide 4402 (the planet), a country 4403, region 4403, state 4403, city 4403, residence 4404, household 4404, and a single person or identity 4405. In addition searching may include both global searches 4406 and/or specialized searches 4406 such as for publicly controllable PCs 4406, publicly controllable television set-top boxes 4406, places 4406, multiple cameras to observe or record one location in depth 4406, tools 4406, applications 4406, broadcast networks 4406, individual shows 4406, news reports 4406, resources 4406, etc.

This facility's functionality may be accessed by a range of TP devices and means 4408 that include LTP's 4411, MTP's 4411, RTP's 4409, VTP's on AODs/AID's 4410, RCTP's, etc. that are described elsewhere such as in FIG. 90, as well as by types of devices that include electronic communications hardware and software as listed elsewhere.

This facility's directory service(s) is based on known technologies that may include one or a plurality of databases 4420 and encompass a scalable and flexible system that may expand to a large number of records in a large number of users from a multiplicity of devices and networks, including functions and management to ensure good performance. This maintains the information needed in areas such as users 4420, identities 4420, profiles 4420, each identity's devices 4420, (if a connection is requested or in use) current presence data 4420, each user's face recognition data 4420, shared spaces 4420, places 4420, tools 4420, resources 4420, etc. In addition said facility's directory service(s) may access data sources 4420 for additional information, updates, etc.

This facility's physical architecture 4414 enables sharing between a plurality of IPTR that may be located worldwide 4414 so the mechanism(s) by which they may be found in access include means enumerated in this facility, any known means to accomplish this, and new means that may be invented in the future. In some examples of said physical architecture 4414 eight gateway such as the TPOG may provide access to an index, pointers, "map", etc. 4415 4416, and a plurality of these may be synchronized by means such as replication, messaging, updating, or any known means. After said synchronization (such as between 4415 and 4416) two or a plurality of said indexes, pointers, "maps", etc. may each provide access to said Directory(ies) database(s) 4420. One or a plurality of these Directory(ies) database(s) 4420 may be in a plurality of locations around the world 4417 (such as in some examples depiction of Directory(ies) database(s) 4420 servers in North America, Europe, Asia and Australia). In addition, said facility's directory serviceI(s) 4415 4416 4418 4417 may include means to access data sources 4419 for additional information, updates, etc. Said data sources may be public 4419 and/or private 4419, and said private resources may be accessed through secure access means such as firewalls, automated login, VPN access, corporate security systems, network security systems, etc.

In some examples devices, network(s), database(s), architecture, etc. may access and utilize a new combination of known Directory capabilities whose components include functions 4423, TPSSN (Teleportals Shared Spaces Network) 4424, Shared Planetary Life Spaces 4424 and IPTR 4424, revenue generation 4425, and reporting 4426. Within these components, some examples of functions 4423 include finding identities 4423, finding places 4423, finding tools 4423, finding resources 4423 etc. (by means of browsing, searching, special searches, bookmarking, reuse, etc.); address books/contact lists 4423, reusing what others have assembled and developed 4423, reporting 4423, adding/editing/updating/managing 4423, preferences and or settings 4423, other capabilities 4423, etc. Also within these components, some examples of the TPSSN (Teleportals Shared Spaces Network) 4424, of SPLS's 4424 and IPTR 4424 include entering and using SPLS's 4424 such as connecting with identities 4424, using tools and resources 4424, being numerous places 4424, and other IPTR 4424, etc. Also within these components, some examples of revenue generation 4425 (which is optional) include sponsor services 4425 and vendor services 4425 such as advertising 4425, relevant messaging 4425, reporting to vendors and advertisers 4425, payment systems for paying for sponsor services 4425, payment systems for paying users' Paywalls 4425, etc. Also within these components, some examples of reporting 4426, dashboards 4426, etc. include answering core user questions such as "How am I doing?" 4426, "Tell me what I need to know" 4426, "Show me what I need to do" 4426, custom reports and/or dashboards 4426 (such as set goals, metrics, alerts, etc.), setting delivery options for reports/dashboards 4426, choosing training options from recommended improvements 4426, etc.

Some example include components such as functions 4401 4423, devices and networks 4408, Directory(ies) database(s) 4420, physical architecture 4414, components 4422 such as main functions 4423, TP Shared Spaces Network(s) (TPSSN) 4424, TPSSN revenues 4425, Directory(ies) reports 4426, Directory(ies) dashboards 4426 etc., which allows a plurality of IPTR to access information 4420 and components 4422 4423 4424 4425 4426 for SPLS's and SPLS connections to their IPTR as well as to IPTR located in a Directory(ies) and external to an SPLS.

ARM and TP Directory(ies)—process summary: Some examples of process are provided in FIG. 102, "ARM and TP Directory(ies): Process Summary," which includes at a high level processes 4428, repositories/analyses/improvement 4438, and some examples of services and reporting 4444. The first of these, processes 4428, includes global Directory processes 4436 such as adding, creating, modifying, editing, updating, deleting, etc. It also includes some example Directory(ies) processes such as Enter/update Directory(ies) entries 4430 (which includes both automated and manual entries and updates of identities, profiles, SPLS's, places, tools, resources, etc.); Finding, browsing and/or searching 4431 for IPTR (such as identities, places, tools, resources, etc.); SPLS (shared spaces) 4432 which may each include IPTR, as well as processes for adding, editing, updating, deleting, etc. each SPLS; See and connect to IPTR 4433; If a connection is not completed 4434, automated branching to the appropriate service for each type of connection such as messaging (if an identity), reconnection (if a place), reservation (if the tool or resource), etc.; Other capabilities 4435 such as in some examples special searches, local address books, assemblies, synchronizations, etc.

The second of these, repositories/analyses/improvement 4438, includes the Directory(ies) database(s) 4439, data sources 4439, analyses 4440 of Directory(ies), analyzed data 4441, development 4442, and directory improvement services 4443, which in turn include Directory(ies) database(s) 4439 which include, in some examples, identities, profiles, SPLS's, places, tools, devices, resources, presence (as needed), face recognition data, etc.; A plurality of data sources 4439 which may include similar and/or additional information that replace, augment and/or supplement said Directory(ies) database(s); Analyses of Directory(ies) data 4440 such as data mining, metrics-based analyses, goals analyses, etc.; Analyzed data 4441 which, after an analysis (es) is run saves said analyzed data so that it may be rapidly accessed in both prepared and custom reports, dashboards, etc.; Development 4442 may be provided by the TP utility, third parties, contractors, consultants, services, repositories, forums, committees, independent developers, etc. to provide advancing capabilities in the Directory(ies) comprising applications, services, modules, code, templates, user interfaces, etc. and may incorporate performance statistics, most successful patterns, best practices, etc.; Directory(ies) improvement services 4443 include both data (such as described above, below and elsewhere) and optimization processes (such as described elsewhere) that improve the operation and results from the TP/ARM Directory(ies).

The third of these, in some examples of Directory(ies) services and reporting 4444, includes some example services and reporting (with others described elsewhere). These begin with Directory lookups and SPLS connections such as individual public identities 4446, private identities 4447, secret identities 4447, groups 4449 (including public, private and secret SPLS's and IPTR), and the public 4450 (including in some examples everyone everywhere). For each of these, they include Directory(ies) lookup and use processes 4448 such as presence 4448, connections 4448, add/edit/update/delete/etc. 4448, find 4448, profile 4448, authorize 4448, value 4448, etc. (such as the various functions in some summary examples 4401 4422 in FIG. 101). This third area of some examples of Directory(ies) services and reporting 4444 includes reports, dashboards, alerts, etc. 4451 that may include directive guidance such as Tell Me 4452; Show Me 4453; Recommendations 4453; capabilities such as alerts 4454, goals, metrics, etc.; delivery options 4455; training and/or learning options 4455; etc.

In some examples of these areas 4428 4438 4444 an integrated process includes using the Directory(ies) processes 4429 which then read 4437 from Directory(ies) database(s) 4439, and also write appropriate data 4437 to these Directory (ies) database(s) 4439. In some examples a user may manually add, edit or update 4430 by reading/writing 4437 any of their Directory(ies) database(s) 4439 data such as their identity 4439, profile 4439, SPLS IPTR 4432 4439, face recognition photographs 4439, etc. In some examples may also be seen by means of an individual identity (if public 4446, and if private or secret 4447) or a group 4449 adding/editing 4448 their identity, profile, SPLS IPTR, or other data by reading/writing 4456 it in the Directory(ies) database(s) 4439. In some examples a user may use the Directory(ies) 4439 or data sources 4439 to find, browse, search etc. 4431 for IPTR, and when found, see and connect 4433 to said IPTR; but if a connection is not available at that time 4434, then defaulting to messaging 4434, reconnecting 4434, or reserving 4434 said IPTR 4433. Again, some examples may also be seen by means of an individual identity (if public 4446, and if private or secret 4447) or a group 4449 finding 4448 an SPLS and/or IPTR in the Directory(ies) 4439, connecting to it 4448, and if a connection is not available branching to services 4448 described elsewhere (such as messaging, reconnecting, reserving, etc.).

In some examples of these areas 4428 4438 4444 is reporting 4451, dashboards 4451, alerts 4451, etc. which begins with analyses 4440 of Directory(ies) data 4439 in some examples by data mining 4440, in some examples by metrics-based analyses 4440 (such as metrics like success, satisfaction, unusually low or high frequency of use, etc.), in some examples by goals analyses 4440 (such as data that might be listed in profiles or from data sources like income, education, market value of one's house, etc.), etc. These analyzed data 4440 may be prepared for reporting and archived 4441 so that they may be used in some examples for an individual's and/or identity's personalized or comparison reports 4451, in some examples for an individual's and/or identity's personalized or comparison dashboards 4451, in some examples for an individual's and/or identity's personalized alerts 4451, etc. Said reports 4451, dashboards 4451, alerts 4451, etc. may take numerous forms and formats as described elsewhere, and may also be directive and provide personalized comparisons and guidance. In some examples of these is "Tell Me" 4452 such as personalized information to users and/or identities of what they need to know based on the gaps between them and others. In some examples of these is providing recommendations 4453 and/or "Show Me" guidance 4453 such as suggesting to users and/or identities what they should do based upon gap analysis combined with the differences in the profiles and data of those who are most successful from the user receiving the report. In some examples of these is actions 4454, capabilities 4454, etc. derived from analyses, reports, etc. that may include setting goals 4454, choosing or prioritizing metrics 4454, setting up or editing alerts 4454, etc. In some examples of these is delivery options 4455 for reports, dashboards, alerts, etc. Another of these is training and/or learning options 4455 derived from said analyses, reports, etc. These delivery options 4455 and/or training options 4455 may include on-demand 4455, automated 4455, API's from other applications, Web services, etc. 4455, AKM 4455, dashboard deliveries 4455, scorecard(s) deliveries 4455, e-mail 4455, voice messaging 4455, tutorials, interactive applications or media 4455 etc.

In some examples of these areas 4428 4438 4448 is Development 4442 and TPN/ARM Directory(ies) Improvement Services 4443 which utilize usage data, AKM task failure/success records data (as described elsewhere), user satisfaction data, and other types of data from areas and services such as Directory(ies) processes 4428 4429; look up and use services 4444 4445; analyzed Directory(ies) data 4440 4441; reports run, gaps found, and actions taken 4451; database(s) analyses 4439; to determine development priorities 4442 and two create, modify, improve, or add Director(ies) processes, services, features, functions, etc. 4436. Sources of development are described elsewhere (such as in some examples FIG. 176) and may include TP built, TP bought, third-party, contractors, outsourcers, Web services, standards-based SOA services, enterprise services, white label services, customer-created, etc. These may be used to provide new or improved capabilities in the Directory(ies), and may include best practices, most successful patterns, usage data, TP/AKM optimization, AKM records, etc.

Numerous process examples are possible, but many other Directory capabilities, functions, features, systems, services, etc. are known and practiced technologies 4435 4448 4451; this ARM and TP Directory(ies) process provides means for including and/or utilizing both known and new Directory(ies) capabilities 4442 4443 4436 as needed or as desired. Simply as one example among many possible examples, assemblies 4435 include means for automated and/or manual analyzing directory profiles and collecting possible team members for specific projects, which makes it possible to utilize sad ARM and TP Directory(ies) to find and solicit potential working groups of various types and levels of experience from a plurality of locations worldwide.

Directory data/flows—abstracted architecture: Turning now to FIG. 103, "Directory Data/Flows—Abstracted Architecture," this illustrates an abstracted architecture for ARM and TP Directory(ies) that permits a range of varied implementations. This figure, which includes a data architecture and data flows for Directory(ies), includes Access 4458 4461 with access that may be based on LDAP, HTTP, XML, CGI, SMTP, API's, SSL (Secure Sockets Layer), Widget(s), Servlet(s), Portlet(s), Client(s), Tool(s), Interface(s), Application (s), etc., with Sources that may include the TPU, Vendor(s), Governance(s), third parties, Web services, etc. By means of said Access 4458 4461 the user receives Directory(ies) data provided by Directory Services, Directory Servers, Directory Applications, etc. 4459 4462, which is retrieved from Directory Storage, Directory Databases, Etc. 4460 4463 when appropriate, encryption may be used to provide security during transmission and/or storage.

This architecture 4458 4459 4460 provides for both known and new types of Directory(ies) applications 4459 4462. These may include directory services, servers, applications, components, etc. from TPU/TPN, ARM, third-parties, vendors, governances, Web services, etc. such as my identity (ies), my profile(s), search IPTR, browse IPTR, specialized searches of IPTR, SPLS (then search SPLS's, browse SPLS's, specialized searches of SPLS's, etc.), central/group/local/personal address books with groups or categories of IPTR, automated or manual add/edit/update/configure/delete/register IPTR, group IPTR, associate IPTR, exchange IPTR, sell IPTR data, view IPTR by item or group (identity, location, business, organization, skills, education, history, performance, map, calendar, flip interface, carousel interface, etc.), settings and preferences for SPLS's and IPTR, presence awareness for IPTR, create/edit/delete alerts, reporting/dashboards unsuccessful uses of SPLS's and IPTR relative to others uses, etc. These directory services 4462 may be used to control one or more Directory(ies) and each user's and/or identity's profile(s), data, etc. by their authorized users/owners, by one or a plurality of vendors, by one or a plurality of governances, etc. with each type(s) of control, and/or and level(s) of control, set by each or a plurality of directory services, applications, tools, systems, methods, etc.

The Directory storage 4460 4463 4464 provides storage of and controlled access to said directory data. With this architecture 4458 4459 4460 the combination of access 4461 and services 4462 provide a range of accessibility and utility for stored Directory(ies) data 4460 4463 4464 4465. The location (s) of said stored Directory(ies) data 4460 4463 4464 4465 is in one or a plurality of storage locations that may be protected by known security means such as a authentication(s), encryption(s), firewall(s), etc. These security means may be utilized at the access 4458 4461, services 4459 4462 and/or the storage layer(s) 4460 4463; or alternately said security means may be utilized individually in varying types and amounts at each of these access, services and/or storage layers. In some examples in this storage layer 4460 4463 directory data may be stored using a combination of authorization and encryption, though alternate approaches to said storage security may be used in a plurality of architectures or designs. Depending on the policies of each Directory(ies), users may control none, some or all of their respective directory data 4463 4464; to the extent each has control, and to the extent that each service(s) permits it, each user may (optionally) authorize control of some or all of their stored data by others such as by a vendor(s), a governance(s), etc.

At this storage and database(s) layer 4460 4463 4464 one or a plurality of Directory(ies) databases 4464 may be utilized by one or a plurality of infrastructures, utilities (such as the TPU), third-party vendors, etc.; or provided by one or a plurality of infrastructures, utilities (such as the TPU), third-party vendors, etc.; and delivered by means such as access 4461, sources 4461, services 4462, etc. comprising components 4465 such as: Architecture 4465: File system(s), schema(s), API's, storage services, storage servers, backup/restore, failover recovery, etc.; Audit service(s) (optional) 4465: Activity logging, change logging, audits, etc.; IPTR profiles 4465: Profile for each IPTR, privacy identifier, attributes, data, authorization/authentication data, contact data, connection data, TP devices, TP capabilities (especially VTP, RCTP, etc. and their attributes), functional capabilities data, alerts and notifications, etc.; Identity attributes 4465: Contact data, biography data, GOID, face recognition data, other biometric identifiers, devices (optional services by device), etc.; AKM attributes 4465: AKM identity(ies), AKM attributes, pointers to AKM record(s), etc.; Etc.

It should be understood that the Directory(ies) data/flows whose architecture is depicted in FIG. 103 may be implemented in various ways and some examples are described herein. In some examples functions may not be grouped in layers but instead may be constructed as modules, other components, or other architecture layers in various ways. In some examples objects that are shown in the figures in separate may be combined in any given arrangement(s). In some examples access protocols 4458 4461, stored data 4460 4463, and directory application(s) 4459 4462 may be combined in a single system. In some examples functionality may be distributed between separate organizations' client access 4462, protocols 4461 and directory storage 4463 4464 in various ways (such as through various Web widgets or servlets that may be distributed and/or embedded) while still providing the Directory(ies) described herein. In some examples functionality may be distributed by API's that may be created by third-parties, and/or third-party Directory(ies), directory applications, etc. so that independent developers may provide additional Directory(ies), directory services, editing/updating, applications, functions or features that are either called by or within other applications or services such as those provided by vendors, a third-party, a governance(s), Web services, distributed applets, etc.

Entering and updating Directory(ies) entries (IPTR): A growing range of IPTR (Identities, Places, Tools, Resources, etc.) sources are available from a plurality of means in our digital environment, with especially large numbers of Tools and Resources already available and in many types of uses. In the TPU, ARM, AKM, etc. it is desirable to integrate these varied components with the IPTR so that SPLS connections may be added or made, as "always on" for immediate access and accessibility—by means of acquiring and utilizing various data from a plurality of directories, contact management systems, databases, etc. As our digital environment grows it generates, develops, produces, acquires, etc. a plurality of lists, directories, contact information, data about individuals (including their families, households, devices [such as for communications, entertainment, computing, etc.], preferences, etc. It also generates, develops, produces, acquires, etc. a plurality of IPTR lists for corporations, groups, organizations, business associations, households, or other collective entities. (In some examples many organization's contact management systems are extensively developed, such as directories of large organizations that can display multiple personal attributes such as job titles, functional skills, locations, etc. as well as contact information such as e-mail addresses, mailing addresses, multiple phone numbers, etc.) It also generates, develops, produces, acquires, etc. a plurality of lists, maps, GIS (Geographic Information Systems), and data about places (including categories of locations such as airports, parks, highways, restaurants, hotels, schools, cities, neighborhoods, etc.). Similarly it generates, develops, produces, acquires, etc. a plurality of lists, databases, and other means for accessing tools and resources. In addition, it also develops utilities, tools, applications, etc. for discovering devices on a network such as for discovering various devices and electronics on a corporate, organizational, home, Wi-Fi or wired network. Because of security vulnerabilities in corporations these discoveries may even extend to peripherals such as a USB "thumb drive," a digital music player (that may be used as an external hard drive), etc. that is attached to a company laptop computer that is on a corporate network.

A significant problem of these many different systems is the difficulties of having to access many different types of systems, applications, databases, lists, directories, etc. defined even just the contact information or access address for one IPTR, much less its associated data. In some examples the information on a single person may require acquiring a business phone number and business e-mail address from a business directory, a home phone number or cell phone number from a telephone directory, an e-mail address from an e-mail directory, a tax collector's property database for information about that person's home (such as its current assessed value), still nascent and largely unavailable face recognition databases for identity recognition, etc. This is even more of an obstacle if the goal is, in some examples a combination of recognizing an identity, calculating the potential value of their skills for achieving a particular goal, automatically adding them to a positive "watch list," then focusing on an immediate and available SPLS connection to request working together to achieve that goal. This becomes even more difficult when a user would like to find particular IPTR such as having an automated job applicant evaluation system rapidly analyze a large number of potential contacts to locate prospects who might fill a new job opening that requires (in some examples) software engineering skills and employment experience in a technology company, or to have a similar automated system analyze a number of available tools such as remote PCs to find one that has a particular type of photographic editing software and is accessible at no charge or for only a small fee. As a result, there exists a need for a component that can access multiple sources of IPTR data, and employ their data to add, enter, update, delete, etc. IPTR records in one or a plurality of Directory(ies), such that multiple users, third-parties and others may access said Directory (ies) and benefit from the data stored therein.

On the surface this may appear excessively complex but there are known technologies, systems, methods and processes that fill these needs. A combination of them may be utilized for developing a TPU/ARM/AKM/and/or Directory (ies). That is, these various IPTR sources may each provide some of the data in a combined Directory(ies), but then each may query an additional Directory(ies) or data source(s) to receive the more complete, compiled IPTR data from a plurality of sources. Therefore, a plurality of sources are ultimately benefiting themselves, each other, the general population of IPTR who may now form "always on" SPLS connections, etc.

A high-level description of this Directory(ies) service includes processing services that enable the integration of data from a plurality of sources that contain IPTR information even if they have a plurality of differences such as classifying data using different formats, and naming data items using different names. Said Directory(ies) service is in communication with the plurality of sources, and may add new sources over time. The Directory(ies) service provides an information model with a common classification format and naming that is used by the Directory(ies) service. Processing services translate information from the formats used by the respective sources and the format used by the Directory(ies) service. During use the Directory(ies) service may acquire initial, updated and new information from the various sources to produce its detailed data about each IPTR. The respective providing sources, as well as others may also query the Directory(ies) service to obtain substantial volumes of compiled IPTR data systematically. In some examples an individual user may create a new SPLS with a plurality of IPTR (Identities, Places, Tools, Resources, etc.) and populate the entire SPLS, or keep it automatically updated and current, by synchronizing it with the Directory(ies) service's data stores. This provides for a plurality of identities to each create a plurality of SPLS's, where each SPLS remains ready to provide "always on" outbound and inbound connections to all of its IPTR.

Turning now to FIG. 104, "Entering and Updating Directory(ies) Data Stores," this illustrates in some examples Directory(ies) service's main components in which a great deal of the known technologies is not shown. This starts with source directories and data 4466 that each has one or more relevant data stores containing appropriate IPTR information, such as Source 1's data stores 4466, Source 2's data stores 4466, Source 3's data stores 4466, Source N's data stores 4466, etc. These sources and their data storage are accessible either online by means such as the Internet 4467, a TPN 4467, a TPU 4467, another type of network 4467, etc.; or directly by physical, manual or other means. These Sources' data stores (such as Sources 1-N) 4466 are integrated by means of Processing Services 4470, stored in Directory(ies) database(s) 4476 4477, and obtained by Retrieving Services 4484.

Processing Services 4470 include data acquisition and updating management 4471 (which defines and manages the acquisition of each data store and entering/updating of the Directory(ies) database(s)); Directory(ies) data model 4472 (which provides a single model used throughout Directory (ies) which enables the acquisition, storage and distribution of said data); data access and translation services 4473 (which coordinates the translation of data from a plurality of Sources' data stores into the Directory(ies) data model, including such data as a translation definitions database to store and retrieve a plurality of translation data); rules engine (s) 4474 (which tracks variances between a Source's data store(s) and the Directory(ies) data model and applies particular rules when certain variances are triggered); workflow processing 4475 (handles the processing of the addition and/or updating of Directory(ies) entries). These Processing Services 4470 4471 4472 4473 4474 4475 may (optionally) be centralized or they may be provided by a plurality of Directory(ies), but they do not need to be duplicated by each Source (nor optionally by each Directory(ies)) for its data stores.

Directory(ies) data stores 4476 and Directory(ies) database(s) 4477 are added to/entered/updated/deleted/etc. by said Processing Services 4470 4471 4472 4473 4474 4475 by means such as auto-acquiring/auto-updating 4478 a plurality of individual directory entries automatically acquired from a corresponding to a plurality of disparate contact and other types of Sources' data stores 4478. This includes auto updating a plurality of individual directory entry items 4478 with data such as identity, group, location, contact, business, skills, education, etc. data that is automatically acquired from a plurality of disparate Sources' data stores. Additionally, in each directory entry the individual (and/or authorized others) may (optionally) update/edit their Directory(ies) entry individually 4479 including adding additional data such as interactively taking current face recognition photos, supplying biometric data (such as fingerprints), and/or automatically supplying additional Place, Tool, Resource, etc. data when queried to provide the data that will be used to identify IPTR such as during SPLS connections, SPLS protection, RTP observations, etc. Another component of the Directory(ies) data stores 4476 is means for it to display requested information 4480 (such as from Retrieving Services 4484 4485 4488), means for it to transmit requested information 4480 in a range of formats (such as from Retrieving Services 4484 4486 4487 4488), etc. These Directory(ies) data stores 4476 and Directory(ies) database(s) 4477 may (optionally) be centralized or they may be provided by a plurality of Directory(ies), but they do not need to be duplicated by each Directory(ies) for its data stores (that is, multiple different Directory(ies) may utilize the same Directory(ies) database(s) 4477 and/or the same automated entries 4478, automated updates 4478, manual updates 4479, authorized third-party edits or updates 4479, data display 4480, data formatting for transmission 4480, etc.).

Retrieving Services 4484 includes providing means for displaying requested information about individuals and/or identities in a plurality of views 4480 such as identity, location (geography/map), contact information, group(s), business/employment, job level and/or title, skills, education, organization(s), history, performance, calendar, timeline, carousel, etc. It also means displaying requested information about PTR (Places, Tools, Resources, etc.) in a plurality of views sufficient to choose and access the desired one(s). This includes looking up requested data in the Directory(ies), then displaying and/or transmitting said data by means such as common customer reviews service(s) (which manages the lookup of IPTR data requested, aggregates it based upon the type of data needed [which may differ depending on whether it is in Identity, Place, Tool, Resource, etc.], and may [optionally] translate the format of said retrieved data to fit the requestor, and also includes various features and options such as selectively changing the designated view, initiating new searches using key terms that may be found in the Directory(ies) database(s) records, selectively and interactively filtering the data retrieved by classifications/categories/rankings/etc.; etc.); SPLS synchronization services 4486 (which may [optionally] be utilized when any outbound or inbound SPLS connection is made to confirm and automatically [or optionally manually] update the current data of the IPTR of either party in the outbound or inbound connection); bulk query service(s) 4487 (which may be utilized by data Sources 4466 who may issue a request to retrieve bulk data 4467 4487 that updates their data stores 4466 with current data from the Directory(ies), in which may also be utilized by other Directory(ies) users 4468 who may include third-party's, applications with APIs, etc. that can request 4467 4487 and utilize a range of Directory(ies) data 4468); and (other) multiple Directory(ies) services and capabilities 4488 (some of which are enumerated in 9981 in FIG. 105. These Retrieving Services 4484 4485 4486 4487 4488 may (optionally) be centralized or they may be provided by a plurality of Directory(ies), but they do not need to be duplicated by each user 4468 nor by each Source 4466 (nor optionally by each Directory(ies)) for its data requests.

In some examples said Directory(ies) may not contain IPTR that is requested. In this case, Directory(ies) users 4468 such as users, identities, third-parties, applications, APIs, Web services, widgets, portlets, servlets, etc. may request retrieval 4484 4485 4486 4487 4488 of an item(s) such as IPTR not in Directory(ies) 4476. When said requested item(s) is not available in Directory(ies) database(s) 4477, then retrieval process 4481 4482 begins by utilizing Processing Services 4470 4471 to search a plurality of disparate directories 4466, access and translate requested item 4473 4474 4475 into the Directory(ies) data model 4472. Said found and translated data 4482 4470 4466 is then displayed in the Directory(ies) format and layout requested 4482 4485 4488, or is formatted for transmission 4482 4486 4487 4488 for remote display or use 4468. After said new data has been found and translated 4482 4470 4466 then add it to the Directory(ies) 4483, or update the Directory(ies) with the new data 4483. These retrieval of items not in Directory(ies) 4468 4484 4481 4470 4466 may (optionally) be centralized or they may be provided by a plurality of Directory(ies), but they do not need to be duplicated by each user 4468 nor by each Source 4466 (nor optionally by each Directory(ies)) for these data requests.

In some examples of means to update Directory(ies) data is provided in FIG. 105, "Action-based Updating of Directory(ies) Data/Retrieving and Using Directory(ies) Data." In some examples action—based updating of Directory(ies) Data 9982 begins with IPTR actions or data that are stored and/or tracked 9983 in the Directory(ies) database(s) 4477 in FIG. 104. These include edits and changes 9984 in IPTR, contacts, SPLS additions or deletions, etc. which are then used to update Directory(ies) data 9984 (such as in SPLS synchronization 4486 in FIG. 104). Any of these data inputs 9982 9983 or other types of in-use data 9984 that is added to said Directory(ies) are handled by Processing Services 9985 which are illustrated in 4470 4471 4472 4473 4474 4475 in FIG. 104 (and are represented in this figure by Processing Services 9985). In Processing Services 4470 data acquisition and updating management 4471 defines and manages the acquisition data, and data access and translation services 4473 coordinates the translation of data from these sources into the Directory(ies) data model, and rules engine(s) 4474 manage variances between source data and the Directory(ies) data model. Two exceptional steps are noted, and the first of these is to associate the new data with the correct IPTR directory entry 9986 (that is, the correct Identity, Place, Tool, Resource, etc.). The second of these is (when needed) confirm, validate, or authenticate 9987 the new data that is added, so the data record remains accurate. These action-based updates 9982 9983 9984 9985 9986 9987 may (optionally) be centralized or they may be provided by a plurality of Directory(ies), but they do not need to be duplicated by each Directory(ies) for its data stores.

FIG. 105 also provides some examples of the retrieval and use of data in said Directory(ies) illustrated in FIG. 104 and elsewhere. Three of some examples 9970 include retrieving individual IPTR entries 9971, retrieving categories of IPTR entries 9972 to sort/filter/search/rank/browse/review/etc., and retrieving portions of an entire Directory(ies) 9973. In a first individual Directory(ies) entries 9971 may be automatically retrieved such as by users, SPLS's, third-parties, tools, applications, Web services, APIs, widgets, portlets, servlets, etc. In a second categories of identities, groups, places, tools, resources, etc. 9972 may be automatically retrieved—again by users, SPLS's, third-parties, tools, applications, Web services, APIs, widgets, portlets, servlets, etc.; as well as by Sources 4466 in FIG. 104 that have their own data stores and would like to update them by means of users, SPLS's, third-parties, tools, applications, Web services, APIs, widgets, portlets, servlets, etc.; as well as by Sources that have their own data stores and would like to update them with data from the Directory(ies) database(s) 4477. In a third portions of an entire Directory(ies) 9973 may be automatically retrieved such as by Sources that have their own data stores and would like to update them with data from the Directory(ies) database (s) 4477, as well as by users, SPLS's, third-parties, tools, applications, Web services, APIs, etc. that would like to use said retrieved data to communicate on a broader scandal. In some examples of said broader scale communications is an individual identity's creation, launching, communicating and managing of a personal broadcast network. Any of these types of retrieval requests 9970 9971 9972 9973 or other types of retrieval requests are handled by means such as illustrated in FIG. 104, which are represented in this figure by Directory (ies) access, display and formatted transmission services 9974.

Multiple Directory(ies) services and capabilities 4488 in FIG. 104 are described in part in some examples of each IPTR entry's capabilities 9981 some of which include: Edit, update, delete, etc. profile 9981; Authorize another(s) to manage/edit data 9981; Receive actions-based data and update Directory (ies) records 9981; Setup/edit Shared Planetary Life Spaces (SPLS) 9981; Manage list(s) 9981 (contacts, connections, groups, friends, etc.); Local list(s), SPLS(s), etc. 9981 (auto-sync with Directory(ies)); Device lists 9981 (with vendors, plans, services, etc.); Preferences 9981 (such as Delivery Profile, etc.); Standard messaging 9981 (such as "Send me a note" when not available, etc.); Security data 9981 (IDs, passwords, single sign-ons, etc.); AKM user profiles 9981 (such as goals, AKM records, etc.); Reporting, dashboard(s), alerts, notifications, etc. 9981; Etc.

As described elsewhere, the application of known and new directory technologies enables numerous Directory(ies) capabilities such as my identity(ies), my profile(s), search IPTR, browse IPTR, specialized searches of IPTR, SPLS (then search SPLS, browse SPLS, specialized searches of SPLS, etc.), central/group/local/personal address books with groups or categories of IPTR, automated or manual add/edit/update/configure/delete/register IPTR, group IPTR, associate IPTR, exchange IPTR, sell IPTR data, view IPTR by item or group (identity, location, business, organization, skills, education, history, performance, map, calendar, flip interface, carousel interface, etc.), settings and preferences for SPLS's and IPTR, presence awareness for IPTR, create/edit/delete alerts, reporting/dashboards unsuccessful uses of SPLS's and IPTR relative to others uses, etc.

Also as described elsewhere, such as 4840 in FIG. 108, the application of known technologies enables additional Directory(ies) capabilities such as personal goals 4840 (which of my goals are being achieved by others, where and how?), group/governance success 4840 (how successful are a group's or governance's members in achieving their goals?), job searches 4840 (find jobs), employee searches 4840 (find prospects for a new job opening with specialized skills, experience or other requirements), assemble teams anywhere 4840 (locate identities with skills and experience, tools, resources, etc.), school alumni finding 4840, groups of connections 4840 (find a specific group and connect with those people), fill e-commerce needs 4840 (such as searching, browsing, shopping, etc.), gifts 4840 (wish lists for giftgiving 4840, shipping addresses 4840, shipment tracking 4840, etc.), etc.

Directory(ies) search and browsing interface(s) for IPTR: FIGS. 106 and 107 illustrates first the TPU/TPSSN process of selecting and saving preferred user interfaces for searching and/or browsing the Directory(ies), and second the TPU/TPSSN process for optimizing the default search and browse interfaces (along with recommending the "best" interfaces during use). This begins by accessing the Directory(ies) 4800 by means of searching or browsing directly 4801, or by means of accessing the Directory(ies) via third-parties, applications, APIs, Web services, widgets, portlets, servlets, etc. 4802. If the Directory(ies) are being accessed directly 4801 by searching or browsing, then used the logged in user ID 4804 or the logged in identity 4804 to access that profile 4805, determine the preferred interface for that profile 4805, and adapt it for display on the current device 4805. The means for this flexible and personalized interface model are described elsewhere (such as in FIGS. 183 through 187) in which a TP virtual repository 4807 may include interface components such as templates (layouts), designs (interfaces), patterns (functions), portlets (components), widgets (components), servlets (components), applications (software and/or software modules), features (e.g. sharing, presence, speech, etc.), APIs, etc. By means of said TP virtual repository 4807, and by means of said user interface preferences that are saved to a user profile 4805 (or identity's profile 4805), access and apply the preferred interface to searching 4806, browsing 4806, results display 4806, next steps 4806, etc. As appropriate for each interface 4806 the interfaces retrieved from said interface repository 4807 may include one or a plurality of http, XML, CGI, SMTP, APIs, widget(s), servlets(s)), portlet(s), client(s), tool(s), application(s), etc. 4807. Since these are stored in a user's or identity's profile 4805 these personalized interfaces may be provided not just by directly searching or browsing the Directory(ies) 4801, but they may also be accessed for logged in users and/or identities, and provided by a third-party, by vendor(s), governance(s), APIs in externally provided applications, services, etc. 4802.

Additionally and if desired and set by a user or identity 4804 4805 4806 4807 said Directory(ies) interfaces may be applied to other Directory(ies) services and capabilities such as 4488 in FIGS. 104 and 9981 in FIG. 105, which may include my identity(ies), my profile(s), search Directory(ies), browse Directory(ies), specialized searches of Directory(ies), SPLS (then search SPLS, browse SPLS, specialized searches of SPLS, etc.), central/group/local/personal address books with groups or categories of IPTR, automated or manual add/edit/update/configure/delete/register IPTR, group IPTR, associate IPTR, exchange IPTR, sell IPTR data, view IPTR by item or group (identity, location, business, organization, skills, education, history, performance, map, calendar, flip interface, carousel interface, etc.), settings and preferences for SPLS's and IPTR, presence awareness for IPTR, create/edit/delete alerts, reporting/dashboards unsuccessful uses of SPLS's and IPTR relative to others uses, etc. There are two exceptions, the first is if a preferred interface has not been saved 4805, then use the default interface for either searching or browsing 4804 4805; and the second is if a user or identity is not logged in then use the default interface for either searching or browsing 4804 4805.

Optimizing search and browsing interface: The personally chosen interfaces described in FIG. 106 may be expanded such as by examples illustrated in FIG. 107, "Optimizing Search and Browse Interfaces," which includes means for improving interfaces that may be applied to other interfaces as well, such as in some examples illustrated in FIGS. 183 through 187. Whether a default interface is being used 4804 4806 or a user/identity is using a personally chosen interface 4804 4805 4806 4807 these are represented in FIG. 107 by some search interface examples 4810 and browsing interface examples 4815 that does not include all possible examples. These search interface examples 4810 include a main search page 4011, in Identities Results page 4814, a Places Results page 4812, a Tools & Resources Results page 4813. These browsing interface examples 4815 include maps 4816 (showing WebCams in the Chicago area), maps with filters to highlight different types of content 4821, left three navigation 4817, top menus with center links 4818, a Directory list 4819, videos by category 4820, calendar 4822 (with colored categories), flipbook 4823, a 3D carousel 4824, voice recognition 4825, etc.

Optimizing these interfaces 4821, may include many areas such as their layouts, designs, terminology, labels, UI patterns, widgets, portlets, servlets, components, zones, titles, navigation, etc. some examples of said optimization(s) 4828 are described in the AKM Interface and Content Optimization Service(s) in FIGS. 228 through 231, and FIGS. 238 through 242. Various optimization metrics and/or goals may be used with some examples including highest task success percentage, fewest steps (including back-and-forth steps), etc. Said optimization(s) produces "best" proven interface(s). In some examples these "best" interfaces are offered and/or reported to users during uses 4829 4830 of their current search 4810 and/or browsing 4815 interfaces (whether they are using the default 4804 4806 or have chosen a personalized interface 4804 4805 4806 4807). At some times a user and/or identity may try a "best" interface 4830, and based on their actual results they may keep it 4830 and/or switch back to their previous interface 4830. In some examples at some times a user may view a visible report 4831 that shows and provides options for switching to the current "best" interface(s), widgets, layouts, designs, components, terminology, labels, menus, navigation, etc. Some examples of means for viewing said choices include a link such as "Best interfaces," a menu choice, a navigation option, a widget, etc. In some examples if a user or identity views said "best" interface(s) options 4831 and decides to change an overall interface 4832 (such as for Directory(ies) searching, Directory(ies) browsing, special Directory(ies) tools or features, etc.) or change an interface component or widget 4832 (such as a menu, navigation design, terminology, labels, UI patterns, widgets, portlets, servlets, components, zones, titles, etc.) then said "best" interface 4832 and/or "best" component or widget 4832 is retrieved 4833. In some examples of individual users after examining and/or using it (or them if a plurality of selections are made), it may be saved to said user's profile 4834, in which case it is written to said user's or identity's profile record(s) 4835. In some examples the previous interface choice(s) are retained 4835 so that if said user (or identity) is dissatisfied with the new interface, component(s) and/or widget(s), it is easy to switch back 4832 to the previous (by means such as including this reversal as one choice in the means for switching to the "best" interface 4831). In some examples for one or a plurality of groups of users said optimized interface designs become the new standard interface (utilizing optimization processes as described elsewhere such as some examples in FIGS. 228-231 and FIGS. 238-242).

Select IPTR and connect to it, or make it part of your shared space(s): Turning now to FIG. 108 4838, "Select IPTR and Focus on It, or Make It Part of Your Shared Space(s)," the interface in use has been determined during FIG. 106 "Directory Search and Browse Interfaces" and FIG. 107 "Optimizing Search and Browse Interfaces." Said interface in use is either the default interface 4839, a personalized interface 4839, or an optimized "best" interface 4839, and said interface in use is employed to find, select and connect to IPTR (Identities, Places, Tools, Resources, etc.).

Optionally, the application of other known technologies enables additional Directory(ies) capabilities that may be employed 4840 such as also described in 4488 in FIG. 104. In some examples is personal goals 4840, which of my goals are being achieved by others, where and how. In some examples is the rate of success of one or a plurality of groups and/or governances 4840, how successful are a group's or governance's members in achieving their goals. In some examples is employment-related capabilities such as job searches 4840 (find jobs), employee searches 4840 (find prospects for a new job opening with specialized skills, experience or other requirements), or assemble teams anywhere 4840 (locate identities with skills and experience, tools, resources, etc.). In some examples is school alumni finding 4840. Another example is making connections with a group 4840, find a specific group and connect with those people. In some examples is filling one's e-commerce needs 4840 such as searching, browsing, shopping, etc. In some examples is gifts 4840 which may include functions such as wish lists for gift giving 4840, finding recipient shipping addresses 4840, shipment tracking 4840, etc.

Some additional examples of Directory(ies) services and capabilities 4840 are described in the examples of each IPTR entry's capabilities 9981 in FIG. 105, some of which include edit, update, delete, etc. profile 9981; authorize another(s) to manage/edit data 9981, receive actions-based data and update Directory(ies) records 9981; setup/edit Shared Planetary Life Spaces (SPLS) 9981; manage list(s) 9981 (contacts, connections, groups, friends, etc.); local list(s), SPLS(s), etc. 9981 (auto-sync with Directory(ies)); device lists 9981 (with vendors, plans, services, etc.); preferences 9981 (such as Delivery Profile, etc.); standard messages 9981 (such as "Send me a note" when not available, etc.); security data 9981 (IDs, passwords, single sign-ons, security questions/answers, etc.); AKM user profiles 9981 (such as goals, AKM records, etc.); reporting, dashboard(s), alerts, notifications, etc. 9981; etc.

Also as described elsewhere, the application of known and new directory technologies enables numerous Directory(ies) capabilities 4840 such as my identity(ies); my profile(s); search IPTR; browse IPTR; specialized searches of IPTR; SPLS (then search SPLS, browse SPLS, specialized searches of SPLS, etc.); central/group/local/personal address books with groups or categories of IPTR; automated or manual add/edit/update/configure/delete/register IPTR; group IPTR; associate IPTR; exchange IPTR; sell IPTR data; view IPTR by item or group (identity, location, business, organization, skills, education, history, performance, map, calendar, flip interface, carousel interface, etc.); settings and preferences for SPLS's and IPTR; presence awareness for IPTR; create/ edit/delete alerts; reporting/dashboards unsuccessful uses of SPLS's and IPTR relative to others uses; etc.

If any Directory(ies) capabilities, tools, features, processes, etc. are employed 4840 then those functions and features may be utilized. If they are not used then one or a plurality of outbound Shared Spaces connections 4841 may be found by means of said Directory(ies) searching, browsing, or by deciding to use any of the Directory(ies) capabilities, tools, features, processes, etc. are employed 4840. This includes selecting one or more IPTR to focus on a Shared Space connection with 4842 as continued in more detail in FIG. 112, at which time the focused Shared Space(s) connection may be used 4843 as continued in more detail in FIG. 113. Optionally, if any of the plurality of said found Shared Spaces connections is not part of an SPLS 4484 it may be added to one or a plurality of SPLS(s) 4485 as described in more detail in FIG. 109. If there are no more Shared Spaces connections to add to an SPLS(s) 4484 then said Directory (ies) uses 4839 4840 are finished 4844 and the Directory(ies) usage task ends 4845. If, however some of the Shared Spaces connections are not available then the task is not finished 4846 and it continues 4848 in FIG. 114 which exemplifies some actions when IPTR Shared Spaces connections are not available. Additionally, more new Shared Spaces connections may be desired 4846 in which case Directory(ies) may be accessed for connections 4849 4839.

Figure 109:
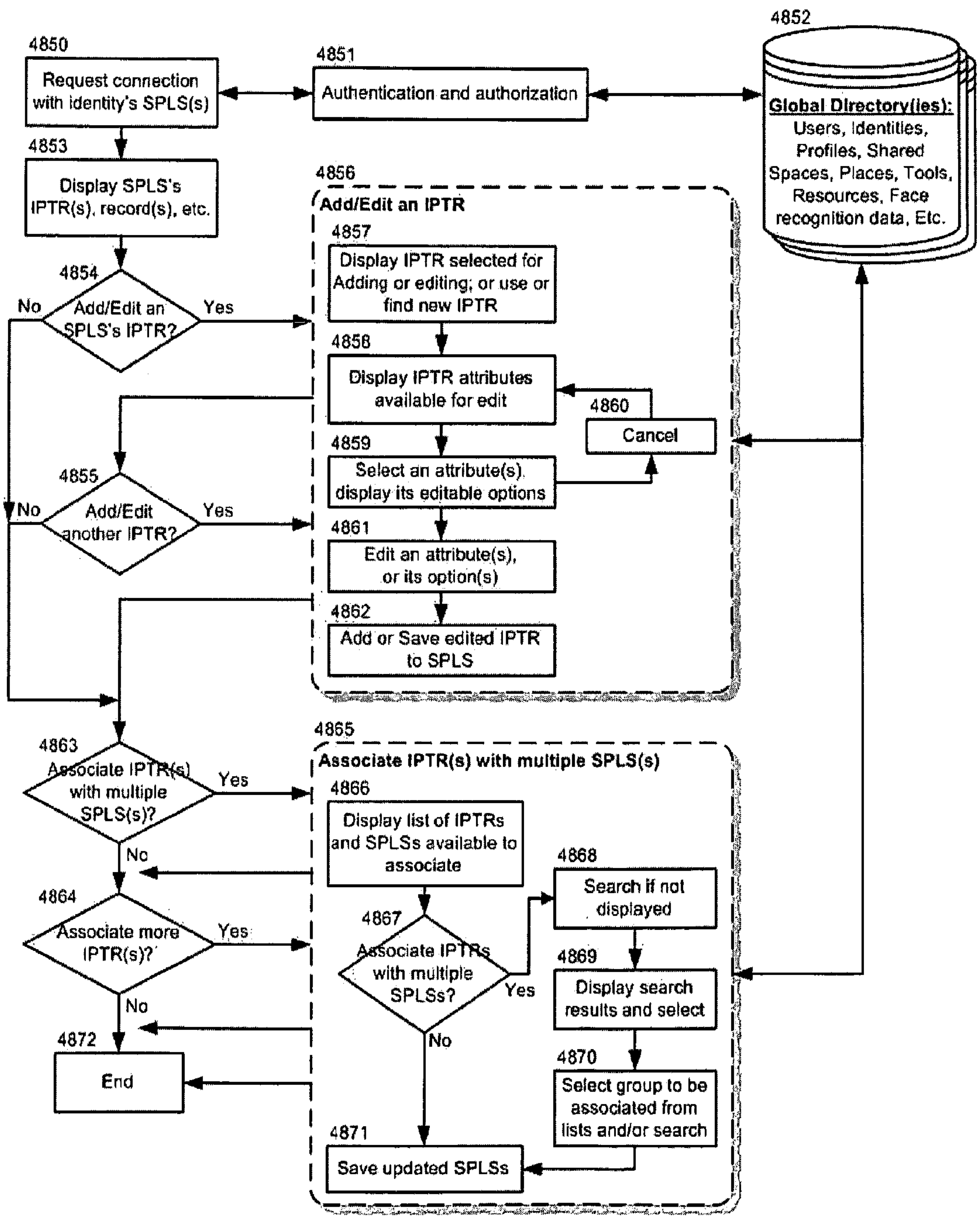
FIG. 109 is a flow chart showing some examples of procedures for adding and/or editing the IPTR in a shared space.

Add/edit shared space(s) services: Turning now to FIG. 109 it is another object of the TPSSN to provide management of SPLS(s) (Shared Planetary Life Spaces) so that these "always on" global connections reflect the worldwide interests and needs of their users. One essential area that enables this is for authorized identities to edit any IPTR in one or a plurality of their SPLS's, and/or associate one or a plurality of IPTR(s) with one or a plurality of SPLS(s). In some examples this includes means for one or a plurality of identity(ies) 4850, vendor(s) 4850, governance(s) 4850, and/or other third-parties 4850 to add/edit IPTR 4854 4856 4855 that belongs to an identity(ies)'s SPLS(s), and/or associate IPTR (s) with one or a plurality of SPLS(s) 4863 4865 4864. Some examples begin with requesting connection to an identity(ies) 's SPLS(s) 4850, which may include public, private, and/or secret identities. Said retrieval requires authentication and authorization 4851 because it may be performed for that identity, a vendor(s), a governance(s), and/or a third-party (ies). If authorized 4851 said requested SPLS(s) are retrieved 4852 and displayed for editing 4853. If an SPLS's IPTR is to be edited 4854 then the IPTR editing process 4856 may include: Select an IPTR for editing 4857 and display said IPTR 4857. Alternatively, if new IPTR is desired a new IPTR connection may be opened 4857 and also FIG. 108; or new IPTR may be retrieved from the Directory(ies) 4839 4840 in FIG. 108. in either case, select said new IPTR for addition to the open SPLS 4857; Display IPTR attributes, preferences, settings, etc. available for editing 4858. For any IPTR selected and displayed for editing, select one or a plurality of editable attributes 4859, and display each one's editable options 4859; If the editable options are set correctly the editing process may be canceled 4860, or if no edit is wanted then cancel 4860; in either case, return to the display of editable attributes 4858; If one or a plurality of edit(s) is needed or wanted, then select the editable option(s) wanted 4861; After desired and available edits are complete, save the edited and/or new IPTR to the SPLS 4862.

If one or a plurality of additional IPTR needs to be edited 4855 from the displayed list of IPTR available 4853, then add it said additional IPTR one at a time 4855 using the add/edit process described 4856. If no initial and/or additional IPTR additions 4854 4855 or edits 4854 4855 are needed, then continue with associating one or a plurality of IPTR(s) with one or a plurality of SPLS(s).

In some examples one user may have a plurality of identities, each identity may have multiple SPLS's and each of said user's IPTR may be associated with one or a plurality of SPLS's 4863 that may be associated with one or a plurality of identities (as described elsewhere). These varied associations may be managed by said identity, or by one or a plurality of authorized vendor(s), governance(s), other third-party(ies), etc. This may result in one user having one or a plurality of identities whose plurality of SPLS's are managed individually (e.g., one SPLS at a time), or are managed all together (all SPLS's are associated with all identities and are managed together), or are managed in any combination of individual SPLS's and groups of SPLS's. In any of these cases an authorized user(s), identity(ies), vendor(s), governance(s), third-party(ies), etc. may decide to associate one or a plurality of IPTR(s) 4863 with one or a plurality of SPLS(s) 4863 4865, then once those SPLS's and IPTR(s) are displayed 4853 they may be associated with each other 4865 by means such as: Select association of a plurality of IPTR's and SPLS's 4863 4865. Display the list of IPTR's and SPLS's available to associate 4866. If the appropriate IPTR(s) is not displayed or listed 4853 4866, and/or if the appropriate SPLS(s) is not displayed or listed 4853 4866, then display Directory(ies) search 4868, My IPTR search 4868, and/or My SPLS(s) search 4868 and search for said IPTR(s) 4868 4852 and/or said SPLS(s) 4868 4852. Display the results of the search(es) 4869, and select the appropriate IPTR(s) and/or SPLS(s) to add an associate 4869. Whether the appropriate IPTR(s) and/or SPLS(s) to associate are initially listed 4853 4866, or if they are obtained by searching 4868 4869 4852, then select the desired set to be associated with each other 4870. After selected IPTR(s) and SPLS(s) have been associated 4865 4870, save the associated and updated SPLS(s) 4871 4952.

If the needed IPTR additions 4856 and/or edits 4856 have been completed, and/or if the needed IPTR and SPLS associations have been completed 4865, then said "Add/Edit Shared Spaces" is finished 4872.

LIFE SPACE METRICS—DIRECTORY(IES), REPORTING AND RECOMMENDATION PROCESSES: How is a Directory different in an Alternate Reality with Shared Planetary Life Spaces? In brief, it becomes more than just a way to store and look up contact information. If it records enough information about a plurality of people and/or identities, and if it is kept updated with new and current information based on users' actions—and if the stored data is periodically analyzed, reported and archived—then a Directory may become a record of some of what we are, what we have been, and what we are becoming—a new way to see and use our "Life Space Metrics." In fact, if said Directory is used for gap analysis—"You" versus "Life," or "You" versus "Your Country," or "You" versus "Your Group(s)"—and if said Directory analyses and reports include recommendations that might help you close your personal gaps, then a TP/ARM Directory may become a way to leap ahead—a new digital paradigm for immediately knowing where you are relative to others and how to move faster toward the best life possible today.

Turning now to FIG. 110, "Life Space Metrics: Directory (ies) Reporting and Recommendation Processes," this exemplifies the analysis of Directory(ies) data 4874 to determine what is most successful and what is least successful for individuals. groups, etc. It can report that widely in, in some examples summative reports and comparative reports in which we are individually compared to others. Because of the gaps between what exceeds the norm what falls below it, and because of the gaps between each of us and what's "best," it can generate recommendations based on the differences in those gaps, so that individuals and groups may gain new opportunities to become "fast followers" in adopting what will fill their personal gaps—perhaps achieving the goals that both individuals and groups dream of reaching. Potentially, the TP/ARM Directory(ies) may become a new way to expand the scope and speed at which we reach for our personal and collective dreams by distributing and adopting what may be more effective ways for us to reach for and realize what is in our hearts.

In some examples Life Space Metrics begins with Directory(ies) data 4874 which, depending upon their configuration, may include users 4874, users' identities 4874, each identity's profile 4874, each identity's Shared Spaces 4874, each identity's places 4874, each identity's tools 4874, each identity's resources 4874, each identity's face recognition data, etc. as well as other data sources 4874 that Directory (ies) may access. Some examples of other data sources 4874 include other directories or accessible databases (as described elsewhere such as in FIG. 104) with sufficient numbers of people, identities, places, tools, resources, and various types of related data of interest to ARM Directory(ies); such as from government agencies, the military, large corporations (whether of their employees, their customers, their prospects, their markets, etc.), a governance, etc. These Directory(ies) 4874 and/or other data sources 4874 may then be analyzed 4875 such as by data mining that determines differences 4875, based upon goals that are identifiable in profiles 4874, based upon selected KPI metrics 4875, or based on other types of analyses 4875. After analyses 4875 said analyzed data is written to one or a plurality of archives of said analyzed data 4879 such as a database of analyzed data that is prepared and ready for summative and/or comparative reporting 4879. Some examples of said analyses 4875 include group categorization and summative/comparative analyses by group such as by geography 4876 (such as summatively reporting one, or comparing a plurality of countries, regions, metropolitan areas, cities, neighborhoods, etc.), such as by demographic groups 4876 (such as by summatively reporting one, or comparing a plurality of categories like gender, age groups, race/ethnicity, etc.), such as education 4876 (such as by summatively reporting one, or comparing a plurality of educational levels like high school dropout, high school, college, graduate school, etc.), such as income 4876 (such as by summatively reporting one, or comparing a plurality of income categories like low income, middle income, upper middle income, high income, etc.), etc. In some examples comparative reporting 4876 may compare one identity (or user, group of identities, etc.) against a group such as using analyses 4875 of Directory (ies) data 4874 and other data sources 4874 to determine the similarities and differences between one identity and those in a higher income group in the same geographic area—to see if any of the gaps and/or similarities may be acted upon so the identity might reach a higher income level. After reporting 4876 said reported data may be written to one or a plurality of archives of said data 4879 such as a database of analyzed data and/or reported data that is prepared and ready for various types of summative and/or comparative reporting 4879.

Some examples utilize said analyses 4875 of Directory (ies) data 4874 and other data sources 4874 to generate ranked data 4875 and ranked reports 4877 by means such as (1) periodically calculating a plurality of metrics 4875 for a plurality of identities 4874 (such as current income, education level, home value, employment level, job title, company size, etc.); (2) performing data mining 4875, gap analysis 4875 or other types of analyses 4875; (3) writing said analyzed data to one or a plurality of archives of said analyzed data 4879 such as a database of analyzed data that is prepared and ready for comparative reporting 4879; (4) periodically determine the range of successes for each metric from archived records 4879 and assign a quartile for the percentages in that range 4877 such as "best" equals top 25%, "average" equals middle 50%, and "lowest" equals bottom 25%); (5) perform data mining 4875 and other analyses 4875 based on quartiles such as: BEST: What do the top 25% do more (or differently) that others do, and by how much more? After determining those items, rank them in frequency order by most frequent first. Write these to the Analyzed Data 4879. BEST: What do the top 25% do the least that others do, and by how much less? After determining those items, rank them in frequency order by the least frequent first. Write these to the Analyzed Data 4879. BEST: What technologies, services, devices, products, etc. do the top 25% use more then those who are least successful? After determining those items, rank them in frequency order by most frequent first. Write these to the Analyzed Data 4879. LOWEST: What do the lowest 25% do the most (that is different from those who are "best") and by how much? After determining those items, rank them in frequency order by the most frequent first. DERIVED from the above: An action list to achieve like the top 25%—What should I do? (In priority order). Write these to the Analyzed Data 4879. DERIVED from the above: AKM input, including AKI and AK, to do "your steps" successfully, for those who choose a specific item, task and step from the above analyses. Write these to the Analyzed Data 4879, and if AKI and/or AK are not available create "stubs" so said AKI. And AK may be added interactively by multiple sources and optimized during use as described elsewhere (such as in the AKM).

In addition, some examples utilize said analyses 4875 of Directory(ies) data 4874 and other data sources 4874 to determine the top 10% 4878 of performers in a plurality of metrics as a "leap ahead" group to emulate. This employs a model of simply determining what they do most frequently in areas such as their technologies, services, devices, products, etc.; and which are used most frequently (in ranked order), so those may be copied directly. While this data alone is likely to be insufficient, when augmented by TP SPLS connections with members of this "leap ahead" group, the means for using their various choices to produce successes will be clearer and night he copied better.

In some examples recommendations 4880 may be included in reports 4880, dashboards 4880, alerts 4880, AKM 4880, etc. Said recommendations may include "Tell Me" 4881 (such as "what do I need to know?" which informs me of what it is that I should know about), "Show Me" 4882 (such as "what do I need to do?" which informs me of actions I might take to achieve various improvements), custom 4883 and/or personalize recommendations 4883 (in which I decide my goals, metrics, criteria, etc. and available recommendations are provided to help me improve in those areas), etc. As a result recommendations may be provided based upon gap analysis 4881 (ranked differences between me and "best" achievements), available action options 4882 (ranked ways to close gaps, and also tracked actions that have worked for others in producing improvements), my self-determined needs 4883 (wherein I decide what is important to me and ranked recommendations are provided for improvements in those areas).

In some examples one or a plurality of a user's identity(ies) may include settings, preferences, etc. in their profile(s) for Delivery Options 4885 for receiving reports 4880, dashboards 4880, alerts 4880, AKM 4880, etc. and optionally may even include finer-grained settings, preferences, etc. for receiving "tell me" information 4881, "show me" recommendations 4882, customized recommendations 4883, etc. These Delivery Options 4885 may include settings, preferences, etc. such as on-demand delivery(ies) 4885, automatic/managed delivery(ies) 4885, AKM delivery(ies) 4885, dashboard delivery(ies) 4885, scorecard delivery(ies) 4885, alerts delivery(ies) 4885, notifications delivery(ies) 4885, e-mail delivery(ies) 4885, voice delivery(ies) 4885, etc.

In some examples one or a plurality of a user's identity(ies) may include settings, preferences, etc. in their profile(s) for Training/Learning/Education options 4886 for learning, training, education, etc. that are based on generated and/or received reports 4880, dashboards 4880, alerts 4880, AKM 4880, etc. and optionally may even include finer-grained settings, preferences, etc. for learning, training, education, etc. that are based on "tell me" information 4881, "show me" recommendations 4882, customized recommendations 4883, etc. These Training/Learning/Education options 4886 may include settings, preferences, etc. such as AKM learning 4886, video learning 4886, on-demand learning 4886, automated/managed learning 4886 (such as with an LMS [Learning Management System]), e-mail-driven learning 4886, voice learning 4886, tutorials learning 4886, interactive learning 4886, etc.

In some examples one or a plurality of a user's identity(ies) may include settings, preferences, etc. in their profile(s) for Action options 4887 for acting upon generated and/or received reports 4880, dashboards 4880, alerts 4880, AKM 4880, etc. and optionally may even include finer-grained settings for acting on "tell me" information 4881, "show me" recommendations 4882, customized recommendations 4883, etc. These Action options 4887 may include settings, preferences, etc. such as do all of "best" 4887, do some of "best" 4887, do none of "best" 4887, choose which of "best" recommendations to use 4887, use AKM 4887, etc.

In some examples one of the objectives of said reporting 4876 4877 4878 4879 4880 4884, recommendations 4880 4884, and personalized guidance 4876 4877 4880 4884 is to enable a plurality of individuals and groups to step to higher rates of personal satisfaction and economic success. These may optionally include ranked comparisons 4877 that make it clear what's best, what average and what's worst; gap analysis that make it clear what succeeds and what fails 4876 4877; recommendations that list ranked actions an individual might take based upon their personal identified gaps from what is most successful 4880 4881 4882 4883 4884 4885 4886 4887; etc.

In some examples one or a plurality of types and levels of comparisons 4876 4877 4880 4881 4882 4883 and/or reports, dashboards, alerts, etc. 4876 4877 4880 4881 4882 4883 may be utilized such as an individual's comparisons with more successful individuals, between groups such as between large corporations, small companies, nonprofit charities, etc.; between government agencies or departments (either within one country or between countries); between educational organizations such as between schools or school districts; between educational levels such as differences between elementary schools, middle schools, high schools and undergraduate colleges; etc.

LIFE SPACE METRICS—RECOMMENDATION SERVICE FOR PERSONAL AND GROUP GOALS: Turning now to FIG. 111, "Life Space Metrics: Recommendation Service for Personal and Group Goals," this adds some examples of how a specific goal or task may be improved by said "Life Space Metrics: Directory(ies) Reporting and Recommendation Processes" such as illustrated in FIG. 110 and elsewhere. Said recommendation service(s) may make visible which lifetime and daily choices produce the highest rates of success, enabling those who learn this to change, evolve, adopt, migrate, etc. toward the goals they want to achieve for themselves and their families. This may help cause faster market share and cultural swings with dominance achievable by what drives the types of human successes we want—when that is faster, better, cheaper and more reachable.

In some examples 4890 said recommendation service begins with a specific goal or task such as "How to expand my SPLS to add 10 identities who each earn over $100K. in my professional field in each of 10 countries worldwide" 4890. This goal is based on the common desire to move into a "better" neighborhood and adopt more of the lifestyle and values that make those people successful. With an SPLS this can be done by connecting to successful professionals worldwide in 10 major countries, such as by the TPSSN—instead of needing to buy a new home and move physically (which would be impossible with this type of worldwide goal), Using a Directory(ies) begins with Stage 1 4891 in which the analysis and reporting process illustrated in FIG. 110 is applied to this specific goal. The Directory(ies) data 4892 and other data sources 4892 are analyzed 4893 such as by data mining 4893, goals analyses 4893, KPI metrics analyses 4893, and other analyses 4893 to develop a custom report(s) 4894 and ranked data 4895 that include what the "best" do more than others to achieve this goal. For this goal, the data is generally available because a plurality of SPLS's may be retrieved from said Directory(ies) data 4892, based on the criteria that each retrieved SPLS should include 10 or more identities who each earn over $100K in a specific professional field in each of 10 countries worldwide. Those SPLS's may then be analyzed 4883 and ranked from those that exceed this goal the most to those that barely meet it, with those analyses 4883 determining what the top 25% of SPLS's do more or differently 4895, and by how much more. Those differences may then be ranked with the largest or most frequent difference first 4895, and that data may also include which technologies, services, devices, products, etc. are used to achieve each of the top differences—providing a new type of "roadmap" for possible ways to reach this goal.

These findings may be reported 4894 4895 with recommendations such as by some examples illustrated in part in Stage 2 4896 which lists the top five actions 4897 in ranked order with the most frequent first 4897 4898, and the estimated increased frequency percentage shown next to each action 4898. In some examples an action recommendation is to run a Teleportal Broadcast Network in your professional field, and the data analysis 4893 indicates that 22% of the SPLS's that reach the highest levels in this goal take this action. The right "Action" 4899 column illustrates various types of action links, buttons or other types of interactive choices 4899 that may be provided next to each recommended action 4897 4898. These Actions include choices such as Do all 4899, Select and copy 4899, Select and join 4899, Create network 4899, Buy best choice 4899, Buy best choice 4899, Select and start 4899, etc. Under each of the action links, buttons or other interactive choices those that say "select" or "create" or "buy" or any other action verb, the top choice(s) are the most frequently used (and known) technologies, services, devices, products, etc. used to achieve that difference. There is room for advertising competing technologies, services, devices, products, etc. next to the one(s) used, but the one listed is "organic" in that it's what was actually used to achieve that goal. For those who do not want to do anything except use available AKM 9701 (as described elsewhere) that choice is provided also, and it may be made a priority focus either by clicking that action ("Do none but use AKM") or by selecting the action link, "Select and start".

After recommendations are delivered 4896 4897 4898 4899 9701 subsequent actions are tracked to determine results and improve future recommendations 9702. This begins by recording steps taken to act on delivered recommendations 9703 such as by making purchases based on the action links, buttons or other interactive choices 4899 that provide direct access to selecting and/or buying the technologies, services, devices, products, etc. used to achieve that goal 4899, as well as competitors that advertise alongside them 4899. Based on subsequent actions such as those recommended and acted upon 9703, periodically update the identity's Directory(ies) data records 9704 for use in future analyses. As a result of these recommendations 4896 4897 4898 4899 9701 and subsequent actions 9702 9703 and tracking of appropriate data from those actions 9704, when the same or new goals questions are asked in the future 9705 4890 use the data from subsequent actions 9702 9703 in the subsequent analyses 4892 4893 and reports 4894 4895 to improve future recommendations 4896 4897 4898 4899 9701.

Some examples utilize data from said subsequent actions 4899 9702 9703 9704 9705 to generate future recommendations for specific goals 9705 4890 under the assumption that this provides the best and most accurate proven data as to the real effectiveness of each recommendation when actually used by real users. In this case, tracking and recording somewhat more detailed actions, behaviors, etc. is essential for generating in-depth results data by means such as (1) if an action is taken 4899, record action and date in user's or identity's Directory data, user profile, etc. 9703 4892; (2) track and record said action(s) 9703 9704 4892 and periodically record the success of that action(s) relative to the initial goal(s) 9704; (3) if during a subsequent periodic tracking and/or analysis 9704, if a successful result is achieved in reaching the initial goal, record that and the date to the appropriate Directory(ies) data record(s) 9704; (4) when the same or related goals questions are asked in the future 9705, analyze and report the updated data 9705 using only data from said subsequent actions 4899 9702 9703 9704 9705 to generate future recommendations for that same goal(s) 9705 4890; (5) the same analysis 4893, reporting 4894 4895 and/or recommendations 4896 4897 4898 4899 9701 may be used (such as best, average, lowest, etc. 4895) to perform gap analysis and calculate/construct future recommendations. In some examples data from action choices 4897 4898 4899 9701 may be provided to advertisers along with data on how users who looked at an action choice respond to it such as whether they researched what was advertised; bought what was advertised; chose the technologies, services, devices, products, etc. used to achieve that goal 4899; or didn't choose any of them.

In some examples users and/or identities may make independent self-service improvements 9990 without employing Life Space Metrics, Directory(ies) Reporting, Recommendation Services, etc. (as illustrated in FIGS. 110, 111 and elsewhere). Self-service improvements begin by searching for the "best" IPTR 9991, searching for the "best" SPLS's 9991, browsing lists or choices of these 9991, etc. when found, either the default is to sort them by a key metric(s) 9991 so the "best" is at the top, or to provide sorting means so one or a plurality of metrics may be selected and used for sorting 9991 to make those that are best easy to choose. After finding them their Directory(ies) data 4892 may (optionally) be analyzed 4893 and reported on such as by ranked reporting 4895, comparative reporting 4894 4895 (to determine gaps between "you" and what is being examined, etc. If wanted the settings, preferences, other copyable elements, etc. may be copied to "your" SPLS(s) 9992, IPTR 9992, etc. to duplicate their performance as much as possible. After copying 9992 they may be saved 9993, used 9993, tracked 9993 measured 9993, analyzed 9993, reported 9993, etc. If the result is not good enough 9994, ineffective for "you" 9994, etc. the process may be restarted by searching for the "best" IPTR 9991, searching for the "best" SPLS's 9991, browsing lists or choices of these 9991, etc. Since data 4892, public identities' SPLS's 4892, public identities' IPTR's 4892, the results from taking actions 4899 9702 9703 9704, etc. are accessible in this Alternate Reality (data from private identities and/or secret identities is not public nor accessible, as any private and/or secret data would be), these public Directory(ies) data are available to others for reuse 9995.

In some examples since SPLS's settings, preferences, etc. may be saved and copied 9992 and new adoptions of recently changed SPLS's may be identified 9703, tracked 9703, and their impact or value recorded 9704 it may be possible to identify the most beneficial new actions 4896 4897 4898 4899 so that results are determined and future recommendations improved 4896 4897 4898 4899 9990 9901. This may make it possible to distribute these widely by means such as reporting 4894 4895, recommendations 4896 9705, responses to queries and searches 4890 9991 to produce larger improvements such as raising incomes, performance and satisfaction widely by making it simple to identify, copy and re-use what works best—achieving an entirely new scope and scale for "fast follower" strategies that may benefit large numbers of people faster than is possible at present.

In some examples because one user may have multiple identities, it becomes possible to create an identity rapidly, populate it with highly successful SPLS's, settings, preferences, etc. and try them out to test what types of "reality configurations" work best for each of us. It is a new paradigm for reality when we can quickly shift between multiple identities where in each the boundaries of "reality" can be set differently—and we can switch simply by logging in or logging out of each of them. In addition, from these new identities, SPLS's and other "new realities" shifts, we can each modify each of these new realities by editing their SPLS's and/or IPTR, test them widely to see how we might achieve various new self-chosen goals sooner, determine their results, then widely distribute our best new discoveries so many others might achieve happier and better lives. In this new paradigm, ARM control over realities becomes direct individual choices, and we can choose to live in the ways that produce what we would like.

In sum, Life Space Metrics may make it visible which tracked choices produce higher rates of success, and also enable those who copy them to move toward those higher levels of success, satisfaction, etc. in an attempt to achieve their goals. These identification, distribution and copying processes may help trigger and directly cause faster market share swings so that commercial and/or organizational dominance becomes more achievable by advances that drive the types of human successes we would like. One Alternate Reality question is whether new products, services, organizations, institutions, etc. might emerge based upon their growing ability to deliver the types of successes people want.

SHARED SPACES SERVICES: At a high level some examples illustrate the TPSSN's means to process a network of SPLS (Shared Planetary Life Spaces) connections. At a high level SPLS Connection Services include outbound Shared Space connections with IPTR (FIG. 112) and inbound Shared Space connections from IPTR (FIG. 115). Some SPLS Connection Sub-services include retrieving the previous state from a prior connection (FIG. 113), identifying and profiling new connections (FIG. 116), and actions when a Shared Space connection is not available (FIG. 114). Also at a high level, the ARM's (Alternate Reality Machine's) Boundary Management Services (FIG. 115) provides managed SPLS boundaries wherein users control what they include in each of their SPLS's, what they exclude from each SPLS, and how they control that (e.g., by means of ARM Boundary Management Services). As part of the ARM Boundary Management Sub-services include a Paywall Boundary (FIG. 117, 118, 119), a Priorities/Filters Boundary (FIG. 120), a Protection and Safety Boundary (FIG. 121, 122, 123, 124), and both Automated and Manual Boundary Setting/Updating Services (FIG. 125, 126, 127, 128, 129). A final component of ARM Boundary Management is physical protection of in some examples one's property, in some examples devices, etc. (FIG. 130) as if one had an expansion of a home (or business) security system.

Select outbound shared space(s) with identities, places, tools, resources, etc.: Turning now to FIG. 112, "Outbound SPLS Connection(s) with Identities, Places, Tools, Resources, Etc." illustrates some initial steps in SPLS connections. In some examples the SPLS connection process starts with an existing SPLS 4500 by selecting a user 4500, and identity 4500, one or a plurality of said identity's SPLS's 4500, then seeing its available IPTR connections 4500 (in some examples such as in its IPTR, and for another example such as its "My Lists"). In some examples said user selection 4500 may be performed by any type of automated biometric recognition 4500; in some examples user selection 4500 may be performed by manual biometric recognition 4500; in some examples user selection 4500 may be performed by any type of login; in some examples user selection 4500 may be performed by any other type of user identification; in some examples user selection 4500 may be performed by any type of user identification combined with a login such that a plurality of methods are required to match or support each other; in some examples user selection 4500 may be performed by a user who is switching between two or a plurality of TP devices in one location; in some examples user selection 4500 may be performed by a user who is switching between two or a plurality of TP devices in a plurality of locations; in some examples user selection 4500 may be performed by a user who is switching between two or a plurality of identities on one TP device in one or a plurality of locations; in some examples user selection 4500 may be performed for providing an identity with continuous digital reality (as described elsewhere); in some examples user selection 4500 may be set to be performed for only a user's last used public identity and not for any of said user's private identities or secret identities (to prevent displaying any private or secret identities without explicit commands from that user, as described elsewhere); in some examples user selection 4500 may be set to be performed for a pre-selected and pre-set one or a plurality of private and/or secret identities (to maintain a continuous private digital reality when explicitly desired, as described elsewhere); and in some examples user selection 4500 may be performed by other means for other combinations of devices and identities. In some examples described elsewhere, other devices and/or other purposes and/or other services (which may include in some examples systems, in some examples methods, in some examples processes, in some examples servers, in some examples applications, in some examples APIs, and in some examples other means) may perform user selection and/or identity selection, and in some examples those user selections may be performed as described above and elsewhere.

In some examples by means of an SPLS that contains a plurality of IPTR 4500, one or a plurality of connections is selected 4503. If multiple connections are selected 4504 they may be selected either individually 4504 (one at a time) or by selecting a group(s) 4504 (in which a group contains a plurality of connections). If multiple connections are selected 4504 then (optionally) ask if all should be focused at once 4506 or use the default and if the answer or default is to focus them individually 4507 then focus on them (or not focus on them) based on the default settings or default order 4509. In some examples the default setting is to focus the multiple SPLS connections with the most recent connection focused first 4509. In some examples the default could be to focus the multiple SPLS connections only one or a subset of connections focused 4509. In some examples the default could be to restore the previous state for the IPTR in said SPLS(s) 4509. In some examples the default could be to focus the multiple SPLS connections first with a pre-set "always connected group" that is outside the current SPLS 4509. In each case, the user may set and save the default state 4509. Whether one or a plurality of connections is selected 4503, and/or one or a plurality of SPLS's and their associated connections is selected 4503, then (optionally) ask if it should be focused in the last state used 4510, and either ask for one, each or all connections 4510, or simply use the default directly. If the answer or default is to focus in the last state used 4511 4512 then periodically save that data during use (and especially when exiting the use of a device) for when an identity's "last state used" is restored in the future. In some examples the default state is the last state used 4512. In some examples the default could be to focus the connection in the most frequent state used 4512; in some examples the default could be to focus the connection in the standard default for each type of IPTR 4512; in some examples another default setting may be set, saved and used 4512. In each case, the user may set and save the default 4512 for how to re-focus previous connections, including (optionally) the default for how to focus each type of IPTR connection. If the SPLS connection is a person or an identity 4513 then determine the current device for that user or identity 4518 by utilizing the TP Presence Service 4519, retrieve said user's or identity's user profile 4520 which contains said user's Delivery Profile (the preferred order of user's devices for immediate communications with said user, such as the LTP first, the MTP second, etc.), and from said TP Presence Service determine the user's or identity's current DIU 4521 (Devices in Use). From the combination of said Delivery Profile 4520 4522 and the current DIU (Devices In Use) 4521 select the user's current preferred, available device 4523 (in some examples said user's LTP) or determine if none are available. Next determine the current availability of each place, tool, resource, etc. connection to be focused 4514 by means of TP Availability Service 4515 which retrieves the place(s)'s, tool(s)'s, resource(s)'s, etc. profile 4516 (for its means of access) and stored address 4516 to determine its current availability 4517 4515. For those IPTR that are available 4524, for each selected person or identity 4518 available, and for each place, tool, resource, etc. connection(s) available 4514 4524 continue with FIG. 113 4525. For those IPTR that are not available 4524, for each selected person or identity 4518 not available, and for each place, tool, resource, etc. connection(s) not available 4514 4524, continue with FIG. 114 4526.

Some examples use Directory(ies) 4502 or other sources 4502 to search and/or browse and find new IPTR wanted with which to connect. Said Directory(ies) processes are described elsewhere such as in some examples in FIGS. 101 through 111. If one or a plurality of IPTR is selected for connection 4503 it is likely that some or many of them are new and are not previously known (by means such as an existing SPLS 4500, Favorites 4501 or other shortcuts 4501 such as recommendations) then these new IPTR may be (optionally) identified 4505, profiled 4505 and/or classified (as illustrated in FIG. 116 and elsewhere). Said identify/profile/classify service 4505 provides means to learn about new IPTR to decide whether or not to connect with it, add it to an SPLS, classify it for various types of treatment or actions (as described elsewhere), etc. Next, if multiple IPTR connections are selected 4506 determine if they should be focused individually or all at once 4506 4507 4509 either by means of a default setting 4509 or by interacting with the user 4506 4507. Then determine whether the connection(s) should be focused in the last state used 4510 and since most Directory(ies) 4502 and/or other sources 4502 provide new IPTR that does not have a previous connection then use the default 4511 4512 such as the standard default state for each type of IPTR 4512. If one or a plurality of the IPTR is a person or an identity 4513 then determine the identity(ies)'s current presence and device 4518 by means of the TP Presence Service 4519 which retrieves each identity's Delivery Profile 4520 and current DIUs 4521 (Devices In Use) 4522 to determine the identity's current preferred available device(s) 4523. If one or a plurality of the IPTR is a place, tool, resource, etc. then determine current availability 4514 by means of the TP Availability Service 4515 which retrieves each means of access 4516 and stored address 4516 and current status/availability 4517. If an identity(ies) is available 4518 4524, and if a place, tool, resource, etc. is available 4514 4524, then continue with FIG. 1134525. However, if an identity(ies) is not available 4518 4524, and if a place, tool, resource, etc. is not available 4514 4524, then continue with FIG. 114.

Some examples start with bookmarks 4501, favorites 4501, shortcuts 4501, lists 4501, recommendations from others or other sources 4501, etc. to see available SPLS connections. Some of these are likely to be known and previous connections such as bookmarks 4501, favorites 4501, some shortcuts or lists 4501, etc. On the other hand, some of these may be new and not previously known connections such as lists 4501, recommendations from other sources 4501, etc. After selecting one or a plurality of connections 4503 (whether selected individually 4504 or by selecting one or a plurality of groups 4504), new connections may (optionally) be identified 4505, profiled 4505 and/or classified 4505 (as illustrated in FIG. 116 and elsewhere) to decide whether or not to connect with it. If multiple IPTR connections are selected 4506 they may be selected for focusing individually 4506 4507 4509 or all at once (whether selection is by default or user interaction). If a connection(s) has been focused previously 4510 determine if it should be focused in the last state used 4510 or in a default state 4510 4511 4512 (whether selection is by default or user interaction). Next, for a person(s) or identity(ies) 4513 determine each identity's current presence 4518 4519, Delivery Profile 4520, current DIUs 4521 (Devices In Use), and preferred currently available device for delivery 4522 4523—or if not currently available. If a place, tool, resource, etc. 4513 determine its current availability 4514 4515, it's access means 4516 and stored address 4516, along with its current availability 4517. For each IPTR that is available 4518 4514 4524 continue with FIG. 1134525. For each IPTR that is not available 4518 4514 4524 continue with FIG. 1144526.

Open outbound or inbound shared space(s) with identities, places, tools, resources, etc.: Turning now to FIG. 113, "Outbound or Inbound Shared Space(s) with Identities, Places, Tools, Resources, Etc.," this illustrates some examples of part of the process of focusing a Shared Spaces connection, regardless of whether it is an outbound Shared Spaces connection or an inbound Shared Spaces connection. In some examples outbound Shared Spaces start with a list of available and present outbound connections 4530 (such as from FIG. 1124525). These "outbound connections to be focused" 4530 each includes data describing the order in which it should focus 4506 4507 4509, the state in which it should focus 4510 4511 4512, its current availability or presence 4518 4519 4514 4515, etc. A main step in focusing each said outbound connection 4530 is to focus it in the state chosen 4532 which includes options such as the previous state from the last connection 4532 (such as 4510 4511 4512 in FIG. 112), the default state for each type of IPTR 4532, etc. This begins for each outbound connection to be connected 4530 by determining the type of connection that it is such as Person/Identity 4533, Place 4534, Tool 4535, Resource 4536, or Other 4537. If the previous state needs to be restored for any of these 4533 4534 4535 4536 4537 then for those connections retrieve the previous state data from each entry 4538 (such as its IPTR listing in a SPLS, its listing as a bookmark or favorite, etc.). Retrieval is accomplished from the current TP device 4541 by accessing each entry 4541. If said entry is in local storage 4542 such as on a local device or in a local data store, then access and retrieve it locally 4542. If, however, said entry is in remote storage 4544 such as on a storage server in the TPN 4544 (Teleportal Network), then access and retrieve it remotely 4544. In either case, a user's and/or identity's SPLS's, IPTR entries, bookmarks, favorites, shortcuts, or other types of Shared Spaces connections data may be stored both locally 4542 and remotely 4544, in which case these data stores are periodically synchronized 4543 by means of any known synchronization technology, method, process, etc. If this focused state chosen 4532 is the default then retrieve what the default is (because the default may be the previous state from the last connection in which case the previous state is retrieved 4538). If the default is the standard default state for each type of IPTR (such as described elsewhere) then focus each of those IPTR connections 4533 4534 4535 4536 4537 in its standard default state. Following retrieval of each outbound connection's state data (if needed) 4538, and/or following retrieval of each inbound connection's state data (if needed) 4538, complete its Shared Spaces connection: If a Person/Identity 4533 then connect by means of the TP Shared Life Connection Service 4545. If a Place 4534 then connect by means of the TP Shared Place Connection Service 4546 (or by means of a web browser 4546). If a Tool 4535 or a Resource 4536 then connect by means of the TP Shared Tool/Resource Connection Service 4547 (or by means of a web browser 4547). If Other 4537 then connect by means of the TP Sharing Connection Service 4548 (or by means of a web browser 4548).

In some examples inbound Shared Spaces start by receiving an approved inbound connection request from an IPTR 4531 (such as 4908 in FIG. 115). This "inbound connection to be focused" 4531 includes data as to whether it is a previous connection and the state in which it should focus. There is no question that the source IPTR is currently available and present because it is a real-time, live inbound connection request 4531. With an inbound connection 4531 there is no process needed for focusing the connection in the correct state 4532 because that is determined by the source of the inbound connection 4531 and in some examples the capability(ies) of the receiving device. Decisions and processes such as focusing in the state chosen 4532, retrieving the previous state if needed 4532 etc. are performed by the source of the inbound connection 4531. The receiving party may accept or deny the request, but once accepted the receiving device is simply connected to the source and displays the image(s) presented by the source.

In some examples an outbound Shared Spaces connection (s) has been made with one or a plurality of IPTR 4530 by means of the TP Shared Life Connection Service 4545, the TP Shared Place Connection Service 4546, the TP Shared Tool/Resource Connection Service 4547, or the TP Sharing Connection Service 4548; and in some examples an inbound Shared Spaces connection has been made pursuant to an inbound connection request from an IPTR 4531. In any of these cases the completed Shared Spaces connection results in seeing a live image and hearing its audio (if any) 4550—essentially, the Shared Space is live and a main focus and, unless specified otherwise by one of the parties, it is controlled by both parties. If this is an outbound Shared Spaces connection 4530 and the previous state is not wanted 4552 4532, the image is in the default location, size, and content for the appropriate type of IPTR 4552. If this is an outbound Shared Spaces connection 4530 and the previous state is wanted 4551 4532, then the image is in the previous location and size if the same TP device is used for the outbound connection 4551. If a different TP device is used such as in some examples when the use of one TP device is ended and the use of a different TP device is started; in some examples when two or a plurality of TP devices are used simultaneously; or in some examples when varying combinations of LTP's, MTP's, RTP's, TP Servers, AIDs/AODs, TP subsidiary devices, and/or other types of devices are used; display the connection in one or a plurality of new TP devices and/or other devices in the default location and size for that type of IPTR 4551 and device, or in the desired location and size for each type of device and IPTR 4552. If possible, within the connection that previously exited and saved contents should be displayed within the connection's image 4551. If, however, the previous state is wanted 4551 4532 but it was not saved when previously exited or ended, then focus the image in the default location, size, and content for the appropriate type of IPTR 4552. Alternatively, if this is an inbound Shared Spaces connection 4531, then the image is in the location in size, and with the audio and content as initially determined and presented by the source 4531.

In some examples of a completed Shared Spaces connection, for each connection in TP device 4553 make available the appropriate functions for that type of IPTR 4553. In some examples if connected with a person, user and/or identity 4553 4545 then functions should be available to start/stop recording 4553, start/stop broadcasting 4553, mute audio for silent observation only 4553, etc. In some examples if connected with each type of IPTR 4553 make available functions appropriate for each type of connection as described here 4553 4545 4546 4547 4548 and elsewhere.

ACTIONS WHEN OUTBOUND SHARED SPACE IS NOT AVAILABLE (IPTR): Turning now to FIG. 114, "Actions When Outbound Shared Space Is Not Available (Identities, Places, Tools, Resources, Etc.)" exemplifies the backup actions taken when an outbound SPLS connection is not available. This process also applies to how the TP SSN responds to an inbound Shared Spaces connection request when the current user, identity requested, etc. is not logged in or available—the remote inbound connecting IPTR receives these responses. Thus, for the outbound Shared Spaces connection(s) requested, collect a list of one or a plurality of not available connections 4556. These should be collected in default order 4556. In some examples the default setting is to respond first to IPTR in the current SPLS 4557. In some examples the default could be to deal with identities before PTR 4557 (that is, people before places, tools, resources, etc.). In each case, the user may (optionally) set and save the default order(s) 4557. The main services for connections that are not available 4556 4558 begins by determining the type of connection that is not available such as Person/Identity 4559, Place 4560, Tool 4561, Resource 4562, or Other 4563. The outbound connecting party (such as a user, person, identity, or automated PTR) may (optionally) decide whether to terminate the outbound connection request 4564 or retry later 4564. Complete termination 4565 may be accomplished by means such as a complete termination option to end all uncompleted Shared Spaces requests 4556, and if selected immediately ending them all 4566. Partial termination 4567 may be accomplished by means such as an option to terminate one or some of the uncompleted Shared Spaces requests 4556, and if selected terminate those desired 4568 while continuing the others 4568. For all not available connections 4556 that are continued and not terminated 4565 4567, the first backup option is to automatically retry these later 4569 by periodically checking the remote connection status by means of the TP Presence Notification Service 4570, which will then alert the party requesting the Shared Spaces connection when it becomes present and available 4570. Following the option to terminate all 4565, one 4567 or some 4567 of the not available connections 4556; and following the option to retry later 4569 and send an alert when a Shared Space connection becomes available 4570, each remaining not available connection is dealt with based upon each type of IPTR: If a Person/Identity 4559 then leave a message 4571 by means of TP Messaging Services 4571 (in which said message may be video, audio, or both). If a Place 4560 then reconnect when available 4572 by means of TP Reconnection Service 4572. If a Tool 4561 or a Resource 4562 then a first option is to place a reservation for said tool or resource 4573 by means of the TP Reservation Services 4573. However, Tools 4561 and/or Resources 4562 have a second option in which one may search, browse, or try to choose a substitute 4574 by means of the TP Substitution Services 4574. If Other 4563 then a reconnection or reservation may be set up by means of the Appropriate TP Service(s) 4575.

INBOUND SHARED SPACE(S) CONNECTIONS—SPLS BOUNDARY MANAGEMENT SERVICES: Parts of the Internet are like a sewer that pumps raw sewage at us, forcing us to block what we don't want. One example is how spam e-mails mushroomed until they swamped the e-mail system so that today spam e-mails dwarf a much smaller percentage of real e-mail. Another example is the large and expanding number of viruses, spyware, Trojan horses, malware, behavior tracking cookies, hidden Flash cookies, etc. that force typical PC users to run antivirus software, firewalls, browser add-ins and other defenses that only usually keep PCs from being infected. A related development is the majority of free, downloadable antivirus "offers" that actually include malware—the problem now disguises itself as the solution. Also interesting, our commercial media culture is supported by advertising so the audience's attention, eyeballs and ears are the "product" that the media sells. This makes the "content" (whether it is entertainment, news, television movies, magazine articles, etc.) into the attract loop that collects the audience, so its attention can be sold. Today's content is carefully planned by producers, editors, directors and other decision-makers for appeal, attractiveness and repeat broadcast value (often for years) so that audiences are large and keep coming back for more. Whether commercial, entertainment, political, news, etc. each part of the generally available public environment is largely planned as best as possible, with goals such as to attract and retain attention, loyalty, belief, etc.

These describe a common shared reality whose control is not in the hands of the people who live in it. That is, however, the nature of current physical reality (prior art).

As a new option, however, the Alternate Realities Machine (ARM) provides ARM Boundary Management Services that turn control over to us. By setting SPLS Boundaries based on what we each want to include and exclude, an Alternate Realities Machine reverses parts of the control over the common shared reality from top-down to bottom-up. We may optionally control parts of our SPLS realities, rather than being forced to pay attention to one common reality that may attempt to exercise varying types of control over us. An example where we have already taken a pre-cursor step into control is with a television DVR (Digital Video Recorder) and a TV remote control. We skip past ads, record only the shows and news we want, and individually manage the entire television system as a digital source where we can choose to record (prioritize) what we want and skip (filter out) the ads, networks and channels that don't interest us. No wonder the cable sources won't sell us an a-la-carte channels plan where we buy only what we want and stop paying for what we don't like. The only way some television networks can exist is by forcing every cable subscriber to pay for them.

The ARM's (Alternate Reality Machine's) ARM Boundary Management Services provides managed Shared Planetary Living Spaces that have some parallels to the ways we use DVR's and TV remote controls to manage the world of "television." We each control what we want in our Life Spaces—which means both including (prioritizing) what we want and skipping (filtering) what we don't want. In addition, examples of initial Boundary Management Sub-services include a Paywall Boundary so we can get paid for our attention instead of providing it for free, a Priorities/Filters Boundary so we can specify what is "in" and "out" in our individual realities, and a Protection and Safety Boundary that provides new means for digital and physical self-chosen personal protections for individuals, households, groups, and the public. This Alternate Realities Machine also includes means to save, distribute and try out new Boundary Settings both quickly and widely—so we can see, access, distribute and try new alternate realities quickly and easily. This includes new types of Paywalls, protections, and filters so the best Alternate Realities may be applied with the scope and scale that the best deserve—potentially providing multiple better competitors than the common reality. In some examples these Automated and Manual Boundary Setting/Updating Services can even be created and marketed by corporations and interest groups who can use their customized realities to improve the lives of those who live in their Shared Planetary Living Spaces, in other examples in their governances, or in other examples in the plans and programs that they provide whether by selling them or otherwise.

Turning now to FIG. 115, "Inbound Shared Space(s) Connections: SPLS Boundary Management Services" begins some examples of the ARM's Boundary Management Services and sub-services. This starts by waiting for an inbound connection request to 4900, with the user able to set an (optional) default 4901 that determines which identities are available to respond to said inbound connection request. In some examples the default setting responds to the logged in identity(ies) only 4901. In some examples the default could be to respond to a group of selected identities 4901 such as all business identities (but no personal or non-business, private or secret identities). In some examples the default could be to respond to all public identities 4901 (but no private or secret identities). In each case the user has means to choose which identity(ies) respond to inbound connection requests 4900. In the event an inbound connection request is received 4904 for an identity that is not currently specified as available to respond, then respond by means of actions for identities not available 4902 (as illustrated in FIG. 114 4903) which include responses that depend on the type of IPTR such as TP Messaging Services for identities, TP Reconnection Services for places, TP Reservation Services for tools and/or resources OR TP Substitution Services for tools and/or resources, or appropriate TP Services for other types of connection requests.

Figure 121:
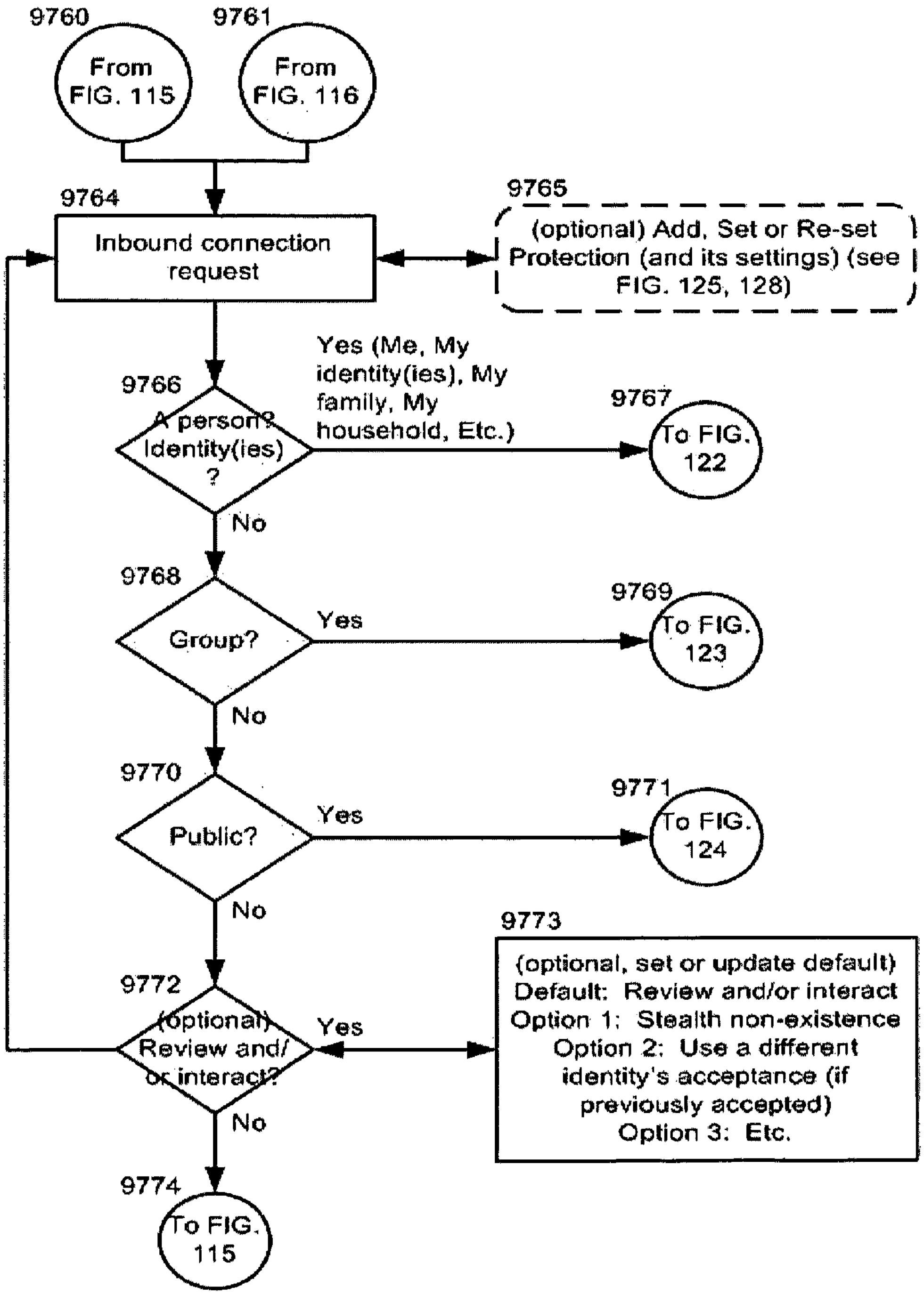
FIG. 121 is a flow chart showing some examples of procedures for TP protection services for individuals (identities), groups and the public.
Figure 122:
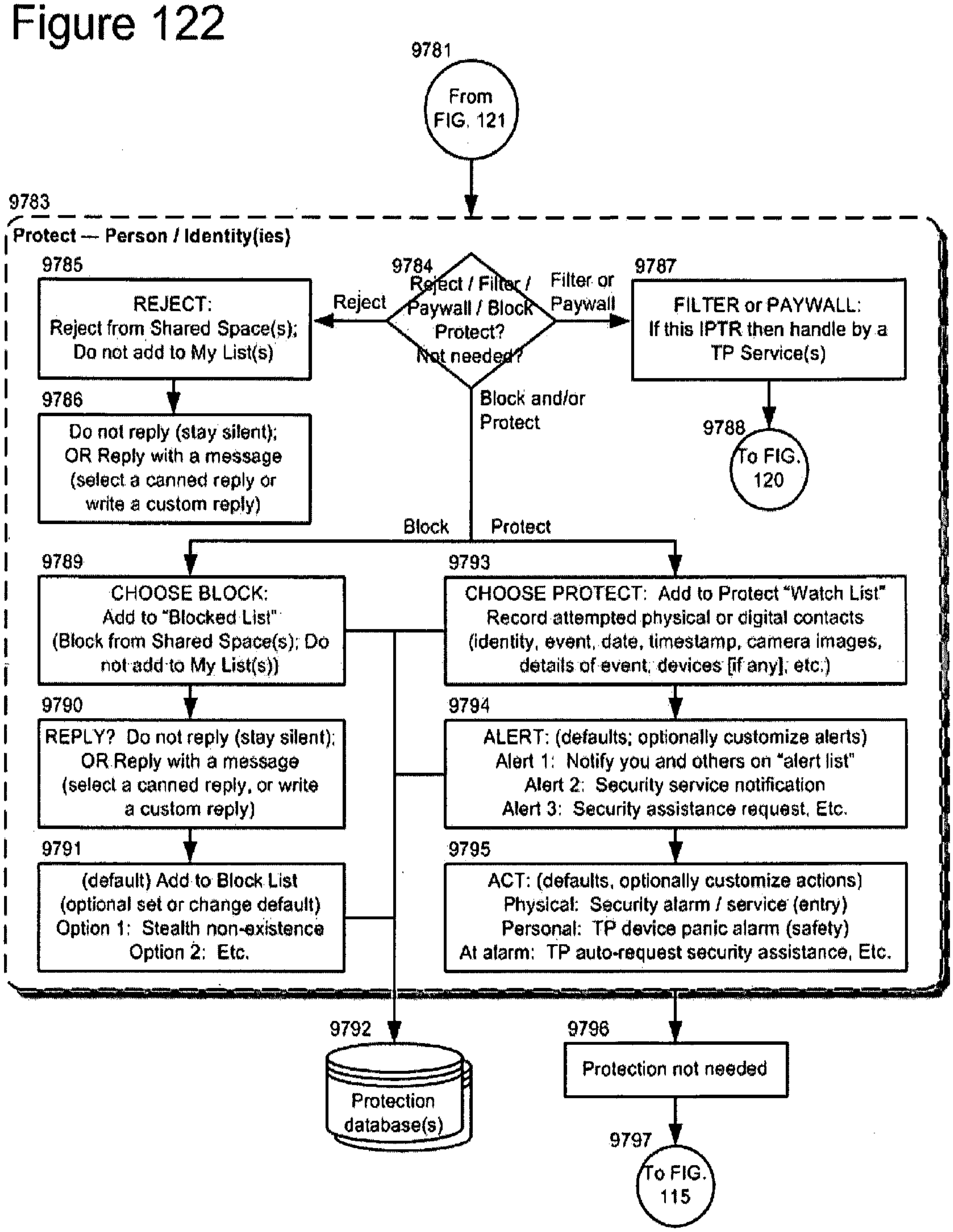
FIG. 122 is a flow chart showing some examples of procedures for protection services for individuals, including in some examples prioritize/filter, paywall, reject, block/protect.
Figure 123:
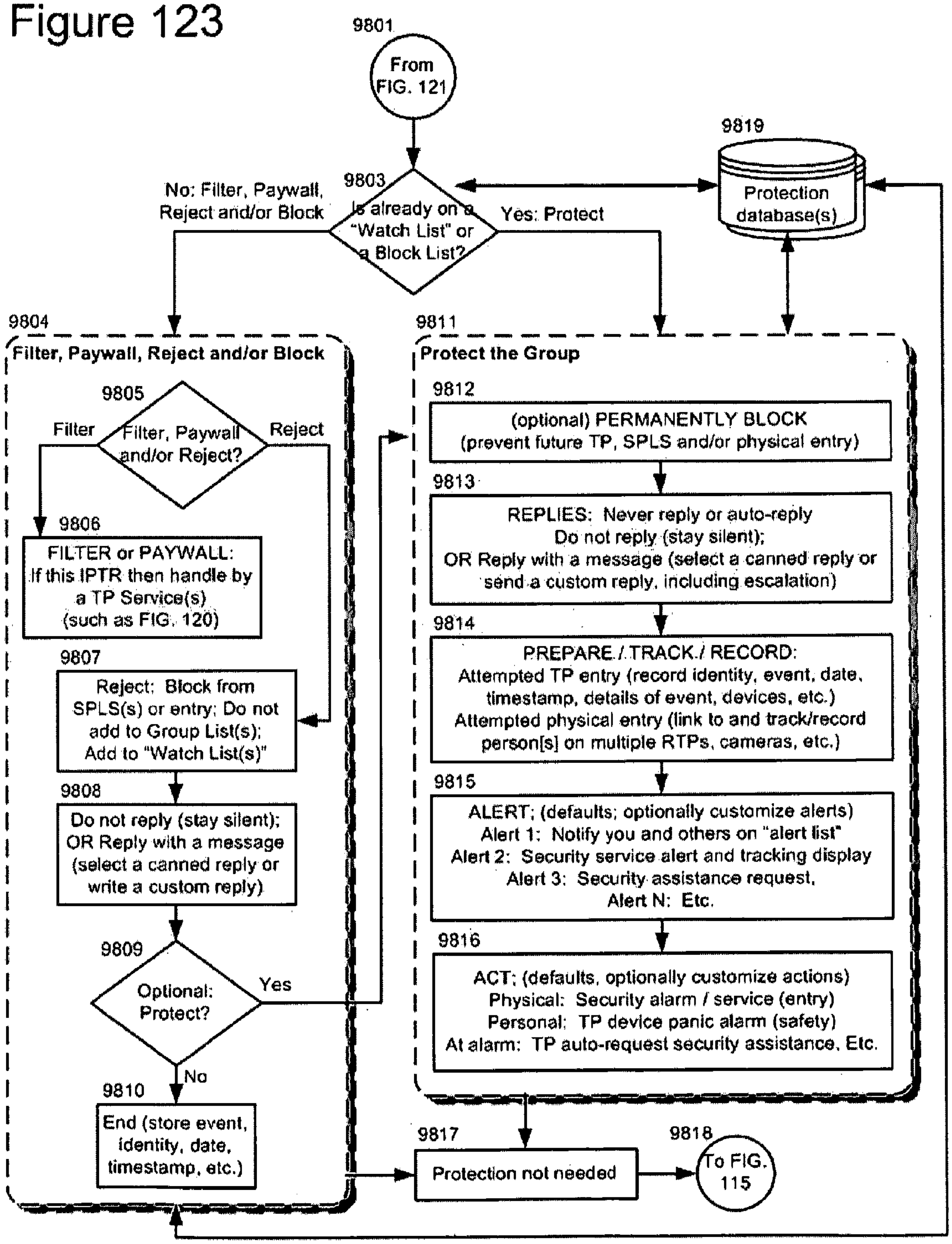
FIG. 123 is a flow chart showing some examples of procedures for protection services for groups, including in some examples prioritize/filter, paywall, reject, block/protect.
Figure 124:
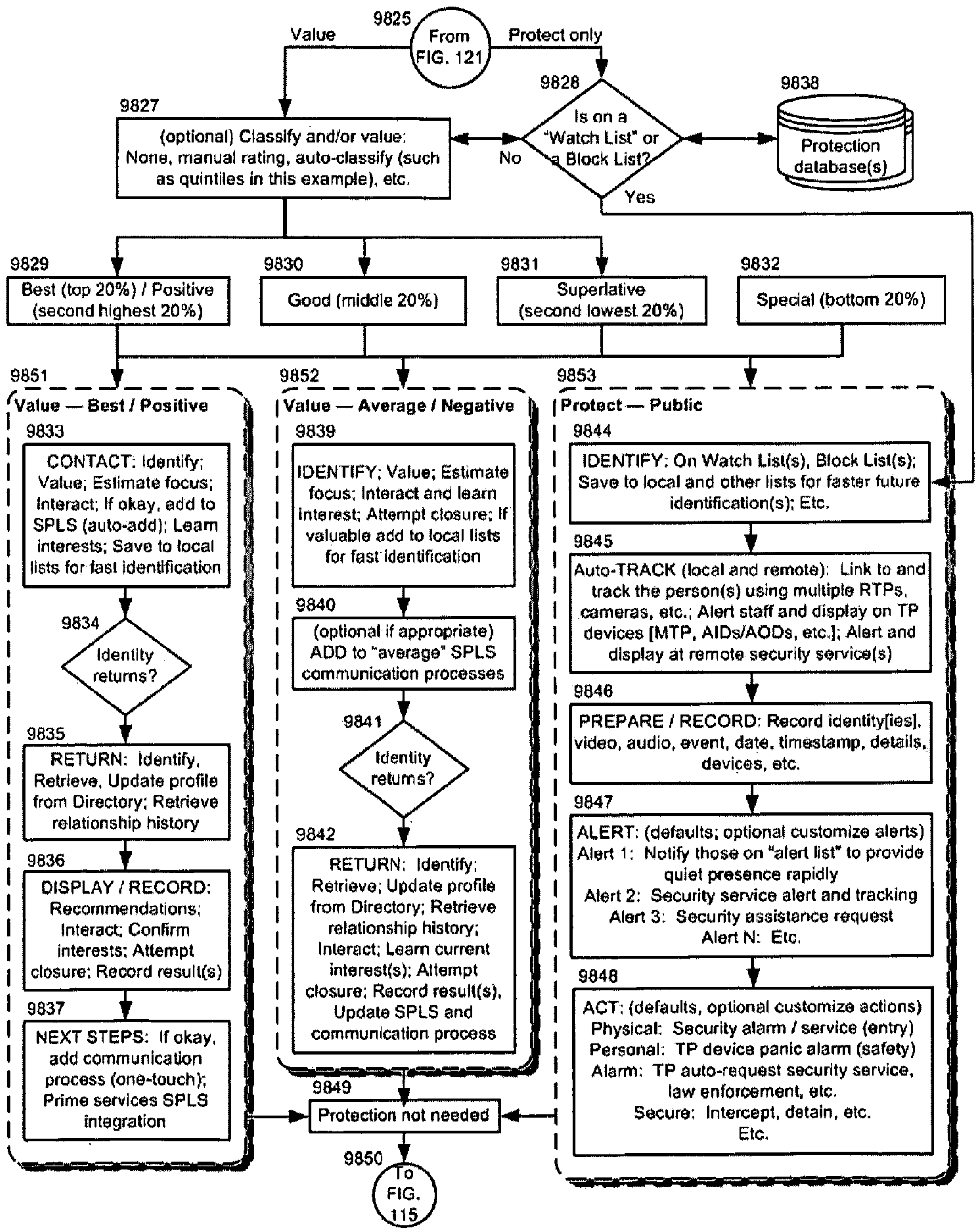
FIG. 124 is a flow chart showing some examples of procedures for protection services for the public, including in some examples value, act, protect.

When an inbound connection request is received 4904 for an identity that is currently chosen to respond 4900 4901 this invokes the SPLS Boundary Management Services 4905 which includes sub-services. In some examples the inbound connection request is from an SPLS member of an SPLS 4906 of a currently responding identity(ies) 4900 4901, then this inbound connection request is automatically approved 4907 and the connection is completed 4908 by means of the TP Shared Life Connection Service (as illustrated in FIG. 113 and elsewhere). In some examples the inbound connection request 4904 is not approved by the SPLS 4906 then if the currently, responding identity(ies) 4900 4901 SPLS's has a Paywall(s) Boundary 4909 then check the inbound connection request 4904 by the TP Paywall Service 4910 (as illustrated in FIG. 117 and elsewhere); and if said inbound connection request 4904 is approved by said Paywall Boundary 4910 4911 then complete the connection 4908 by means of the TP Shared Life Connection Service (as illustrated in FIG. 113 and elsewhere); if said inbound connection request 4904 is not approved by said Paywall Boundary 4910 4911 then take the action determined by the Paywall Boundary, or take no action and continue. In some examples the inbound connection request 4904 is not approved or blocked by the Paywall boundary 4909 4910 then if the currently responding identity(ies) 4900 4901 SPLS's has a Filter(s)/Priority(ies) Boundary 4912 then check the inbound connection request 4904 by the TP Filter(s)/Priority(ies) Service 4913 (as illustrated in FIG. 120 and elsewhere); and if said inbound connection request 4904 is approved by said Filter(s)/Priority (ies) 4913 4914 then complete the connection 4908 by means of the TP Shared Life Connection Service (as illustrated in FIG. 113 and elsewhere); if said inbound connection request 4904 is not approved by said Filter(s)/Priority(ies) Boundary 4913 4914 then take the action determined by the Filter(s)/ Priority(ies) Boundary, or take no action and continue. In some examples the inbound connection request 4904 is not approved or blocked by the Filter(s)/Priority(ies) Boundary 4912 4913 then if the currently responding identity(ies) 4900 4901 SPLS's has a Protection Boundary 4915 then check the inbound connection request 4904 by the TP Protection Service 4916 (as illustrated in FIG. 121 and elsewhere); and if said inbound connection request 4904 is approved by said Protection 4916 4917 then complete the connection 4908 by means of the TP Shared Life Connection Service (as illustrated in FIG. 113 and elsewhere); if said inbound connection request 4904 is not approved by said Protection Boundary 4916 4917 then take the action determined by the Protection Boundary, or take no action and continue. In some examples the inbound connection request 4904 is not approved or blocked by the Protection Boundary 4915 4916 then the currently responding identity(ies) 4900 4901 SPLS's may (optionally) be set to ask the receiving identity 4918 before rejecting or accepting said inbound connection request 4904. If set to ask the receiving identity 4918 then utilize TP Identification Service 4919 (as illustrated in FIG. 116 and elsewhere), and if said inbound connection request 4904 is approved by said identity 4919 4920 then complete the connection 4908 by means of the TP Shared Life Connection Service (as illustrated in FIG. 45B-2 and elsewhere). If the receiving identity 4918 is asked and does not accept said inbound connection request 4904 then (optionally) block said request 4923 or take the current default action 4923 4922. Optionally, if the currently responding identity(ies) 4900 4901 SPLS's is not (optionally) set to ask the receiving identity 4918 before rejecting or accepting said inbound connection request 4904, then the inbound connection requestor 4904 is not asked 4919 and the (optionally set) default action 4921 is taken. In some examples the default setting is "open" 4921 4922 which means everything that is not blocked by a boundary 4909 4912 4915 is accepted, enters and is connected 4908 by means of the TP Shared Life Connection Service (as illustrated in FIG. 113 and elsewhere). In some examples the default 4921 4922 could be to reject and block all inbound connection requests 4904, such as would be the normal setting if a private identity 4900 and/or a secret identity 4900 was the currently responding identity(ies). In some examples the default 4921 4922 could be TP auto-management (such as illustrated in FIG. 114 and elsewhere) wherein responses depend on the type of IPTR such as TP Messaging Services for identities, TP Reconnection Services for places, TP Reservation Services for tools and/or resources OR TP Substitution Services for tools and/or resources, or appropriate TP Services for other types of connection requests. In some examples the default 4921 4922 could be that if rejected by any of the SPLS's boundaries 4909 4912 4915, then use "stealth" mode, which is complete non-existence with no replies, no responses, no acknowledgments, etc. for any reason. In each case the user may (optionally) set and save the default state 4921 4922.

New inbound shared space connection request—TP identification service (identify, profile, value, classify): It has been said that in some examples of an Alternate Reality that has an Alternate Realities Machine, our SPLS Boundaries control our individual Alternate Realities—and our digital boundaries may therefore be under our control. In fact, we may have a personal responsibility to take control simply as part of living a high quality life. Personal control is a different human condition from allowing the common shared reality to control our attention and perception. Turning now to FIG. 116, "Inbound Shared Space Connection Request: Add to a SPLS? Add to a Paywall, Filter or Protection Boundary?" illustrates some examples where we exercise this control, with means for doing this efficiently. In some examples an entirely new inbound connection request is not approved or blocked by an ARM Boundary Service and the currently responding identity(ies) would like to consider accepting (such as approving the opening of a Shared Space connection, viewing an advertisement message, responding with a message, starting an automated interaction to learn more, or taking another boundary action) or consider rejecting and/or blocking said inbound connection request.

In some examples the new inbound connection request 4930 is from a new and unknown requestor 4930, it has not been blocked or managed by an SPLS boundary service 4930, and the currently responding identity(ies) would like to review the requestor 4931 in order to decide whether to accept, reject, block, etc. said new inbound connection request. This decision is made with the assistance of TP Identification Service 4932 which provides means for identifying, profiling, valuing, and/or classifying new connections. While this is illustrated in the instance of an inbound connection 4930 4931, this service may also be used when making an outbound connection, when looking up a potential new connection in the Directory(ies), during any Shared Space connection with an IPTR, or at any time or for any reason desired.

In some examples the TP Identification Service 4932 starts with a new inbound Teleportal connection request from an IPTR 4933. Immediately said TP Identification Service attempts to auto identify 4936 said inbound IPTR 4933 by utilizing SPLS's 4940, My List(s) 4940, Group SPLS's 4940, Group List(s) 4940, Visitor List(s) 4940, etc. because these are faster to access; however, if not found 4940 then TP Identification Service attempts to auto-identify 4936 said inbound IPTR 4933 by means of Directory(ies) 4936. Each of these direct lookups 4940 utilizes any identification data (such as a user's identity, a place's name and ID, a tool's or resource's name and identification, etc.) that may be received along with the new inbound TP connection request 4933. If successful 4940 it retrieves the IPTR's standard "Directory profile" 4940 and displays said profile 4940. If a Directory (ies) look up is not immediately successful 4936 then if recognition is possible TP Biometric Recognition Services 4939 are utilized to provide identification 4939, and said recognition-based identification 4939 is used to retrieve the standard "Directory profile" 4940 and display said profile 4940. If both a Directory(ies) look up and recognition are not immediately successful 4936 4639 then no IPTR has been found 4937 and then if "presence" identification is possible TP Presence Services 4937 are utilized to determine that specific presence and identify it 4937, and said "presence-based" identification 4937 is used to retrieve the standard "Directory profile" 4940 and display said profile 4940. Alternatively, more than one identification may be found for that new inbound Teleportal connection request 4933 then if "presence" identification is possible TP Presence Services 4937 are utilized to determine that specific presence and identify it 4937, and said "presence-based" identification 4937 is used to retrieve the standard "Directory profile" 4940 and display said profile 4940. If "presence-based" identification is not possible 4937 then if recognition is possible TP Biometric Recognition Services 4939 are utilized to provide identification 4939, and said recognition-based identification 4939 is used to retrieve the standard "Directory profile" 4940 and display said profile 4940. If available automated identification means fail 4936 (whether identification based 4940, recognition-based 4939, presence-based 4937, or by another means) then use the default action 4938 for when an identity is not found. In some examples the default setting 4938 is to interact with said inbound IPTR 4930 to request that it provide identity for Directory(ies) look up. In some examples the default 4938 could be to send a pre-determined reply message to said inbound IPTR 4930 such as "Add yourself and a profile to the Directory(ies) then try this contact again." In some examples the default 4938 could be to interact with said inbound IPTR 4930 such as a brief dialogue to learn the reason for the new connection 4938 in order to approve it, reject it, block it, etc. In each case the user may (optionally) set and save the default 4938 for how to respond either automatically or manually when an identity is not found 4936.

In some examples if identification succeeds 4936 4937 4938 4939 4940 by any means, the standard "Directory profile" 4940 is retrieved and displayed 4940, but that display may merely be the default 4941 and other information displays 4941 and/or default settings 4941 may be available. In some examples the default action 4941 is to display the standard short "Directory profile" 4940. In some examples the default 4941 or a selectable option 4941 could be to display a standard longer Directory profile. In some examples the default 4941 or a selectable option 4941 could be to display all available details and information (which could optionally retrieve and display additional data from multiple sources). In some examples the default 4941 or a selectable option 4941 could be to display a Security profile (which would retrieve and display data from law enforcement and other legal records). In some examples any profile 4940 4941 could include user-controlled drilldown to additional information, more details, other sources, etc. In some examples the default 4941 or a selectable option 4941 could be to display a Custom profile (which would be set such as by a group or organization that had particular information requirements about its contacts). In each case the user may (optionally) set and save the default 4941, or utilize selectable options 4941, to determine the IPTR profile information displayed by the TP Identification Service 4932.

As described elsewhere said TP Identification Service 4932 provides means for identifying, profiling, valuing, and/or classifying new connections. While identification and profiling have been described, additional services are available for valuing and/or classifying new inbound connection requests 4933. In some examples these utilize identification 4936 4940 and profile data 4940 4941 to determine if an IPTR is on a "watch list" 4942, a "block list" 4942, or other type of potentially negative identification. As the digital environment grows an increasing number and range of said watch lists and/or block lists are developed, which may include people such as those with a criminal record as a sexual predator or as suspected terrorists, places such as popular restaurants that have frequent celebrity sightings, and tools or resources such as Web domains that originate large volumes of spam. Based on said "watch lists" 4942, "block lists" 4942 etc. new inbound TP connection requests 4933 may be (optionally) auto-identified and/or (optionally) auto-highlighted when profiled 4940 4941 and displayed 4940 4941.

In some examples many types of new inbound TP connection requests 4933 may be (optionally) classified 4943, valued 4943, assessed for danger, etc. Given the volume and scope of digital information on the sources of inbound connection requests 4930 that may be accessed in Directory(ies) 4936 4940 4941 and/or numerous other sources it is possible and often desirable to at least auto-classify 4943 said inbound connection requests 4930, and depending upon one's needs also auto-value 4943 said inbound connection requests 4930. However, there are numerous existing and possible classification systems that may be utilized from a wide range of scientific and academic disciplines, government and regulatory agencies, business and industry associations, demographic and marketing analytics, individual corporations' internal systems, etc. Similarly, valuation is a broad range field since each of these classification systems and more may have their own separate systems and/or processes for valuing what is classified. In some examples the field of ecological economics provides a range of classification systems based upon ecosystem structures, ecological processes, ecological functions (such as regulation, habitat, food production, waste treatment, etc.), ecosystem goods and services that are valued by humans, etc. Those classifications are valued by means of numerous valuation systems and strategies which in the main comprise ecological values (that are based on ecological sustainability), socio-cultural values (that are based on cultural perceptions such as whether particular ecosystems or ecological processes provide goods and services that satisfy human needs), and economic values (that are based on real human costs required to preserve, maintain, remediate, restore, etc. natural ecosystems and their wildlife, and/or the economic benefits from repurposing them for human needs and human economic uses). Therefore, it is not the purpose of this inclusion of automatic classification 4943 and automatic valuation 4943 to define a single system for providing either classification(s) or valuation (s). On the contrary, a simple patent search on "automatic classification," "automated classification," "automated valuation," etc. shows numerous known technologies for accomplishing these.

This includes the ability to utilize known technologies to provide various types of classifications 4943, valuations 4943, and/or exceptional issues as options (along with identification and profiling) as part of the TP Platform, herein within a TP Identification Service 4932 that provides identification, profiling, classification and valuation of new inbound connection requests 4930, as well as outbound requests, Directory(ies) lookups, IPTR that is in a live Shared Space connection, or other IPTR encountered. The components herein include determining what the inbound connection request is, valuation on any scale, and/or any exceptional issues. Some classification examples 4943 include retrieving "what it is" data about IPTR and placing it in a category or classification such as job or profession [as in identifying a person as a lawyer, rock musician, psychologist, artist, police officer, etc.], place [as in identifying a location as a public street view of a factory, inside that factory's private admission area, in the confidential personal office of that factory's manager, inside the secure and highly confidential R&D lab within that factory, etc.], tool or resource [as in classifying video and/or images for faster recognition, retrieval, selection, and use for varied purposes], etc. Some valuation examples 4943 include retrieving data about IPTR, comparing said IPTR's data with other data such as from that IPTR's category, and valuing that specific IPTR on a comparative scale such as a person [as in identifying an identity's credit score and comparing that number against the known range of credit scores], or a place [as in identifying a location's street address, obtaining its current real estate assessment from publicly accessible databases, and comparing that value against a range of retrieved comparative real estate values], or a tool or resource [as in its price if used as a service, its value if an asset or an investment, or what it could be expected to provide if wanted for its features or functions], etc. Exceptional issues 4943 include retrieving data about IPTR that add something that should be known about it [as in possible physical danger such as from a known sexual predator, possible economic risk such as from a known phishing website, possible deceptive marketing such as from a marketing offer where numerous customers have posted negative experiences, etc.).

In some examples after said TP Identification Service 4932 has been used its data 4940 4941 4942 4943 may be reviewed 4944 (including identifying, profiling, classifying, and/or valuing the desired IPTR) and the reviewer may decide whether to accept the IPTR 4945 for connection or entrance, add the IPTR to a boundary 4948 4949 4950, or take another action 4951 such as blocking, sending it to messaging only, etc. If the reviewer 4944 chooses to accept the IPTR 4945 it may be (optionally) added to one or a plurality of SPLS's 4946 (as illustrated in FIG. 109 and elsewhere); and, if added said inbound connection request 4930 may then be completed 4947 by means of the TP Shared Life Connection Service (as illustrated in FIG. 113 and elsewhere), or if physical entry is the request it may then be permitted. Alternatively, if the IPTR is accepted 4945 it may be (optionally) permitted one-time connection 4947 by means of the TP Shared Life Connection Service (as illustrated in FIG. 113 and elsewhere), or if physical entry is the request it may then be permitted. However, if the reviewer 4944 chooses the IPTR may be added to an SPLS boundary such as a Paywall Boundary 4948, a Filter(s)/Priority(ies) Boundary 4949, or a Protection Boundary 4950; and in each of these cases this continues with the appropriate process. However, if the reviewer 4944 chooses a different action may be taken with the IPTR such as blocking it 4951, sending it to the appropriate TP "not available" service 4951 such as described in FIG. 114, etc.

In some examples the new connection information may be received from a recognition device 4934 and these may include as some examples a face recognition camera 4934 (such as at a home, in a car, in various locations throughout a business's properties and offices, facing a public sidewalk, etc.), an RTP 4934 in any location (such as facing locations popular with famous celebrities or politicians, in any store that would like to know and serve its best customers quickly, in a religious institution that wants to be able to address its worshipers by name, in a store with a shoplifting problem, in a bar that wants to prevent fights, or in any location where it helps to identify people and deal with them personally based upon their characteristics), any other biometric or input device 4934 (such as a fingerprint reader, retinal scanner, security door keypad, badge reader, etc.), etc. Using the available data from said recognition device 4934 said TP Identification Service 4932 attempts to auto-identify 4936 said inbound IPTR 4934 by Identity [or person], Identity [or person], utilizing Directory(ies) lookups 4936 (if identity or identification data is received), by means of TP Biometric Recognition Services 4939 (if facial images or other biometric data is received), by means of TP Presence Services 4937 (if only "presence" data is available), by (optional) two-way interactions 4938 (if no other identification means are available), etc. When identification is completed by any means 4936 4939 4937 4938 then profiling 4940 4941 is performed (as described elsewhere), followed by (optional) classification 4943 and (optional) valuation 4943 (as described elsewhere). Based on information from said TP Identification Service 4932 the receiving user or identity may review the information and decide whether to accept the IPTR 4945 for connection or entrance, add the IPTR to a boundary 4948 4949 4950, or take another action 4951 such as blocking, sending it to messaging only, etc.

In some examples new connection and/or entrance requests may be received from any other source 4935. Some examples of these include unscheduled events, incidents, tweets, friend requests, "friend of a friend," unscheduled webinars, notices, alerts, activities, being asked to join others' appointments, etc. Using the available data from said other source(s) 4935 said TP Identification Service 4932 attempts to auto-identify 4936 said inbound IPTR 4935 by utilizing Directory(ies) lookups 4936 (if identity or identification data is received), by means of TP Biometric Recognition Services 4939 (if facial images or other biometric data is received), by means of TP Presence Services 4937 (if only "presence" data is available), by (optional) two-way interactions 4938 (if no other identification means are available), etc. When identification is completed by any means 4936 4939 4937 4938 then profiling 4940 4941 is performed (as described elsewhere), followed by (optional) classification 4943 and (optional) valuation 4943 (as described elsewhere). Based on information from said TP Identification Service 4932 the receiving user or identity may review the information and decide whether to accept the IPTR 4945 for connection or entrance, add the IPTR to a boundary 4948 4949 4950, or take another action 4951 such as blocking, sending it to messaging only, etc.

TP PAYWALL SERVICES: In some examples as part of accepting an inbound Shared Space connection FIG. 115 SPLS Boundary Management Services 4905 may determine whether or not a recognized and known inbound connection request 4904 needs to be approved or processed by that SPLS's Paywall boundary 4909, and if so the appropriate Paywall boundary 4910 is invoked 4966 in FIG. 117. In some examples a new inbound Shared Space connection FIG. 116 may identify a said new inbound connection request 4930 4931 4932 and determine that it needs to be approved or processed by the Paywall boundary 4944 and if so the appropriate Paywall boundary 4948 is invoked 4966. Turning now to FIG. 117, "TP Paywall Services," in some examples a known inbound connection request 4964 is received from boundaries such as SPLS Boundary Management Services 4960, and in some examples a new inbound connection request 4964 is received from boundaries such as new inbound connection requests 4961. In some examples an option (at any time) is to set or reset one or a plurality of settings of the Paywall 4965, described in FIG. 125. In some examples the inbound connection request 4964 is in the Paywall 4967 which is confirmed by means of a Paywall data database(s) 4968. In this example the confirmed inbound connection request 4964 4967 4968 is completed 4969, the payment is deposited in the appropriate identity's Paywall account 4971. In some examples that identity may be required to perform the Paywall action 4969 in order to receive payment 4969 4971 for which some examples are described in FIG. 118. In some examples the payment criteria may need to be validated 4970 of which some examples are described in FIG. 118 and FIG. 119.

In some examples the inbound connection request or 4964 is not in the Paywall 4967, but a Paywall payment offer is received 4972 with said inbound connection request 4964. In some examples a Paywall payment offer 4972 is automatically reviewed 4973 and rejected 4974. In some examples a Paywall payment offer 4972 is manually reviewed 4973 and rejected 4974. In some examples a Paywall payment offer 4972 is automatically reviewed 4973 and accepted 4975. In some examples a Paywall payment offer 4972 is manually reviewed 4973 and accepted 4975. In some examples an accepted Paywall payment offer 4975 may be added to the Paywall 4976 and FIG. 125. In some examples an accepted Paywall payment offer 4975 permits one-time entry 4977 through the Paywall. In those examples 4976 4977 the confirmed inbound connection request 4964 4972 4973 4975 is completed 4969, and the payment is deposited in the appropriate identity's Paywall account 4971. In some examples that identity may be required to perform the Paywall action 4969 in order to receive payment 4969 4971 for which some examples are described in FIG. 118. In some examples the payment criteria may need to be validated 4970 of which some examples are described in FIG. 118 and FIG. 125. In some examples the inbound connection request 4964 is not in the Paywall 4967, a Paywall payment offer is not received 4972, and said receiving identity would like to receive payment 4978 from said inbound connection requests 4964 by adding the source of the new inbound connection request 4964 to a Paywall 4978. In some examples the source of the new inbound request is part of a collective 4979, affiliate network 4979, group 4979, third-party source 4979, or other "association" 4979 so that it may be possible to add the entire "association" to one's Paywall 4979. In those examples the identity may sign up 4980 and submit a request 4980. In some examples the source of the new inbound request is alone and separate 4979 so that it may be appropriate to request that separate source 4979 to join. In those examples the identity may sign up 4980 and submit a request 4980. After an identity has signed up 4980 and submitted a Paywall request 4980 in some examples this joining request 4980 is rejected, whether it is rejected by a collective 4979, affiliate network 4979, group 4979, third-party source 4979, other "association" 4979, by a separate source 4979, or by an auction 4979, in which case the default action is taken 4982. In some examples the source of the new inbound request may be joined by means of an auction 4979 in some examples where the identity places in a bid for the amount they would like to receive in their Paywall, and said bid amount and bid placement may in some examples be automated 4980, and in some examples it may be manual 4980. In some examples. this sign up 4980 joining request 4980 is accepted, whether it is accepted by a collective 4979, affiliate network 4979, group 4979, third-party source 4979, other "association" 4979, by a separate source 4979, or by an auction 4979, in which case the inbound connection request 4964 4978 4979 4980 4981 is completed 4969, and the payment is deposited in the appropriate identity's Paywall account 4971. In some examples that identity may be required to perform the Paywall action 4969 in order to receive payment 4969 4971 for which some examples are described in FIG. 118. In some examples the payment criteria may need to be validated 4970 of which some examples are described in FIG. 118 and FIG. 119.

In some examples the inbound connection request 4964 is not in the Paywall 4967, a Paywall payment offer is not received 4972, and said receiving identity does not become associated 4978 with said inbound connection request source 4964, so the default Paywall action is taken 4982. In some examples the default 4982 is if the inbound connection request 4964 is from a potential Paywall payment source then automatically reply with a request for a large Paywall payment amount 4983. In some examples the default setting is to not reply and maintain stealth by not acknowledging existence in any way 4983. In some examples the default setting is to request this source to be added to the Paywall of that person's one or a plurality of additional identities 4983. In some examples the default setting is to request this source to join a collective 4979, affiliate network 4979, group 4979, third-party source 4979, other "association" 4979 that makes Paywall payments. In each case, the user may set or reset and save the default state 4983.

TP perform required Paywall criteria: In some examples receiving an inbound Paywall connection 4969 requires validating payment criteria 4970 before the Paywall payment is deposited in an identity's Paywall account 4971 9710 in FIG. 118. Said FIG. 118, "TP Perform Required Paywall Criteria," illustrates some examples of the performance of said required Paywall action(s) 9711. In some examples the requirement is only to display inbound connection content 9713, which in some examples is an advertisement. (An example case in which this may occur is with a very low Paywall payment amount.) In this example the content is accepted 9714 or retrieved and downloaded 9714, it is displayed 9714 or played 9714, and (optionally) the Paywall payment amount is displayed 9714 so that the identity knows that they are being paid to receive and view that content 9714. In some examples that display 9714 or playing 9714 is logged in that identity's Paywall database 9715. In some examples that completed Paywall event 9714 is validated 9715 at the source of the inbound connection request 9715. In some examples that completed Paywall event 9714 is logged 9715 at the source of the inbound connection request 9715. In some examples the completed Paywall event 9714 triggers the Paywall payment 9715. In some examples the validation 9715 of the completed Paywall event 9714 at the source of the inbound connection request 9715 triggers the Paywall payment 9715. In some examples the logging 9715 of the completed Paywall event 9714 at the source of the inbound connection request 9715 triggers the Paywall payment 9715.

In some examples the Paywall criteria requires the receiving identity to view the content 9716, listen to the content 9716, etc. (An example case in which this may occur is with a medium or high Paywall payment amount.) In this example the content is accepted 9717 or retrieved and downloaded 9717, it is displayed 9717 or played 9717, and (optionally) the Paywall payment amount is displayed 9717 so that the identity knows that they are being paid to receive and view that content 9717. In some examples a required Paywall action(s) must be performed 9717 and available hardware and/or software means are used to validate said required Paywall action (s) 9717, as exemplified in 4990 in FIG. 119. In some examples if said Paywall action(s) requirement is met 9717 9718 that is logged in that identity's Paywall database 9715 9719 9720. In some examples that Paywall action(s) requirement is met 9717 9718 and validated 9715 at the source of the inbound connection request 9715. In some examples that Paywall action(s) requirement is met 9717 9718 and logged 9715 at the source of the inbound connection request 9715. In some examples the Paywall action(s) requirement is met 9717 9718 and that triggers the Paywall payment 9715 9724 and logging 9720. In some examples the validation 9715 of the required Paywall action(s) 9717 9718 at the source of the inbound connection request 9715 triggers the Paywall payment 9715 9724 and logging 9720. In some examples the logging 9715 of the required Paywall action(s) 9717 9718 at the source of the inbound connection request 9715 triggers the Paywall payment 9715 9724 and logging 9720. In some examples. this validation 9715 and/or logging 9715 may occur at a collective 4979, affiliate network 4979, group 4979, third-party source 4979, other "association" 4979, at a separate source 4979, or at an auction 4979, in which case the required Paywall action(s) 9717 9718 is completed 9718, and the payment is deposited in the appropriate identity's Paywall account 9715 9724 and logged 9720. In some examples that identity would like to receive one or a plurality of Paywall reports 9721, in which case data is gathered 9722 from that identity's Paywall database(s) 9720, data analyses are performed 9722, a summary report 9722 and/or summary dashboard 9722 are displayed, with drilldown to details 9722.

In some examples that identity would like to receive one or a plurality of Paywall reports 9721, in which case data is gathered 9722 from that identity's Paywall account(s) 9724, data analyses are performed 9722, a summary report 9722 and/or summary dashboard 9722 are displayed, with drilldown to details 9722. In some examples that identity would like to receive one or a plurality of Paywall reports 9721, in which case data is gathered 9722 from that identity's Paywall database(s) 9720 and Paywall account(s) 9724, data analyses are performed 9722, a summary report 9722 and/or summary dashboard 9722 are displayed, with drilldown to details 9722. In some examples an option (at any time) is to set or reset one or a plurality of settings of the Paywall 9723, described in FIG. 125.

TP perform required Paywall criteria (example): In some examples a required Paywall action(s) must be performed 9717 before payment is made 9717 9724 and available hardware and/or software means are used to validate said required Paywall action(s) 9717, as exemplified in 4990 in FIG. 119, "TP Perform Required Paywall Criteria (example)." This illustrates examples in which the Paywall criteria requires the receiving identity to view the content 9716, listen to the content 9716, etc. In some examples an identity 4995 will utilize an LTP (Local Teleportal) 4991 to play the Paywall content 4994 such as an advertisement that includes video content, audio content, and may (optionally) include interactive content. In this example the LTP 4991 has an SVS (Superior Viewer Sensor) 4992, a camera 4993, face recognition capability 4993, and face monitoring capability 4993 which determines the orientation of the identity's face relative to the LTP device. In this example the identity 4995 views the Paywall content 4994 such as an advertisement playing on the LTP 4994 4991, the SVS 4992 determines the identity's 4995 position relative to the LTP 4991, and the LTP's camera 4993 performs (1) face recognition 4993 to confirm that the appropriate identity is performing the required Paywall action 4994, and (2) (optional) face monitoring 4993 to confirm that the identity's face 4995 is oriented toward the LTP device 4991 during the performance of the required Paywall action 4994, and (3) (optional) face monitoring 4993 to confirm that the identity's face 4995 is not engaged in distracting activities such as conversation during the performance of the required Paywall action 4994. In some examples the content 4994 may be somewhat interactive and the identity 4995 is required to interact with it in one or a plurality of required steps. In some examples the content 4994 may be highly interactive and the identity 4995 is required to interact with it through numerous required steps. In some examples there may be multiple viewers who are entitled to receive payment for performing the required Paywall action(s). In these examples the content 4994 is displayed 4994 or played 4994 on the device 4991 4994, an SVS 4992 confirms the presence and number of viewers 4995, a camera 4993 performs (1) face recognition 4993 to determine the identities to receive payment, (2) (optional) face monitoring 4993 to confirm that the identities faces 4995 are oriented toward the LTP device 4991 during the performance of the required Paywall action 4994, and (3) (optional) face monitoring 4993 to confirm that the identities faces 4995 are not engaged in distracting activities such as conversation during the performance of the required Paywall action 4994.

Compared to our current reality some may view Paywall payment validations as intrusive, especially when compared to today's complete non-monitoring of advertising viewing and the permitted lack of attention to vendor and other "required" communications. However, the ARTPM's reversals of this current assumption is actually a direct result of easily agreed upon new contracts for services that will accompany Paywall payments, in which one party pays for the viewing or interactive use of delivered content 4994, and one or a plurality of identities 4995 agrees to view or interactively use said content 4994 in return for payments. This new contractual relationship is combined with the ARTPM transformation of networks into monitoring and tracking behaviors, and it utilizes TP devices 4994 4991 to automate contractual validation(s) that the required Paywall action(s) 4990 4994 occurred and the contracted Paywall payment may be made as a result. These technical uses of the ARTPM may be immoral or moral under varying viewpoints, and it is entirely possible to forbid or permit these types of contractual validations under law(s) or by regulation(s), but at the level of an ARTPM they are examples of new business relationships under which a plurality of identities uses an SPLS Paywall boundary to exclude certain communications unless they are paid, and when paid and received agrees to provide the service of viewing or using that content in return for a payment. It has been said that SPLS boundaries provide means to create multiple personal alternate realities, and these examples help exemplify how large an alternate reality this is from our current reality.

TP priorities/filters services: In some examples as part of accepting an inbound Shared Space connection FIG. 115 SPLS Boundary Management Services 4905 may determine whether or not a recognized and known inbound connection request 4904 needs to be approved or processed by that SPLS's Priorities/Filters boundary 4912, and if so the appropriate Paywall boundary 4913 is invoked 9736 in FIG. 120. In some examples a new inbound Shared Space connection FIG. 116 may identify a said new inbound connection request 4930 4931 4932 and determine that it needs to be approved or processed by the Priorities/Filters boundary 4944 and if so the appropriate Priorities/Filters boundary 4949 is invoked 9736. Turning now to FIG. 120, "TP Priorities/Filters Services," in some examples a known inbound connection request 9734 is received from boundaries such as SPLS Boundary Management Services 9730, and in some examples a new inbound connection request 9734 is received from boundaries such as new inbound connection requests 9731. In some examples an option (at any time) is to set or reset one or a plurality of settings of the Priorities/Filters boundary 9735, such as described in FIG. 125 and elsewhere. A Priorities/Filters boundary 9736 deals with the most important aims, activities or areas; and also with the least important aims, activities or areas. This is because large amounts of messages and content may be received 9734 and some of that will be priorities which should get more attention; and some will be not wanted which should get less or no attention.

In some examples the inbound connection request 9734 is in the Priorities boundary 9737, and is confirmed by means of a Priorities/Filters database(s) 9738. In some examples the confirmed inbound connection request 9734 9737 9738 is analyzed by means of content analysis 9735 which is a known technology that may be provided in some examples as a TP service 9739, and may be provided in some examples by a third-party 9739, and may be provided in some examples by a Web service 9739, and may be provided in some examples by other means 9739. If the analyzed content 9739 is important it may be prioritized upwards 9740 in some examples by providing it more visibility 9740, in some examples by providing it more space 9740, in some examples by providing it a physically higher position in a layout or list 9740, in some examples by providing it increased volume 9740, etc. If the analyzed content 9739 has moderate importance it may be prioritized at a mid-level 9740 in some examples by providing it with typical visibility 9740, in some examples by providing it presence but only minimum space 9740, in some examples by providing it a physically mid-level position in a layout or list 9740, in some examples by providing it normal volume 9740, etc. In some examples accepted inbound connection requests 9734 whose content has been analyzed 9739 and prioritized 9740 may be included in an SPLS connection 9745 with the appropriate level of prioritization 9740, display 9740, or playback 9740. In some examples the inbound connection request 9734 is in the Filters boundary 9741, and is confirmed by means of a Priorities/Filters database(s) 9738. In some examples the confirmed inbound connection request 9734 9741 9738 is analyzed by means of content analysis 9742 which is a known technology that may be provided in some examples as a TP service 9742, and may be provided in some examples by a third-party 9742, and may be provided in some examples by a Web service 9742, and may be provided in some examples by other means 9742. If the analyzed content 9742 is not important it may be blocked 9744 or displayed 9743 but prioritized downwards 9740 in some examples by providing it less visibility 9740, in some examples by providing it less space 9740, in some examples by providing it a physically lower position in a layout or list 9740, in some examples by providing it decreased volume 9740, etc. In some examples accepted inbound connection requests 9734 whose content has been analyzed 9742 for filtering and displayed 9743 but with a low priority 9740 may be included in an SPLS connection 9745 with the appropriate low level of prioritization 9740, display 9740, or playback 9740.

In some examples said inbound connection request 9734 has been included in an SPLS connection 9745 at an appropriate level of prioritization 9740 and the receiving identity does not need to alter that item's 9734 Priorities/Filters boundary 9736 9746. In that case the inbound connection requests 9734 is utilized in a Shared Space connection 9745 in the default manner prescribed 9748. In some examples said inbound connection request 9734 has been included in an SPLS connection 9745 at an appropriate level of prioritization 9740 but the receiving identity would like to alter that item's 9734 Priorities/Filters boundary 9736 9746. In this example said identity may (optionally) add this item 9734 and/or its source 9734 to an SPLS Paywall 9747, and if so, then the Paywall is set 9750 or reset 9750 such as described in FIGS. 125, 128 and elsewhere. In some examples said inbound connection request 9734 has been included in an SPLS connection 9745 at an appropriate level of prioritization 9740 but the receiving identity would like to alter that item's 9734 Priorities/Filters boundary 9736 9746. In this example said identity may (optionally) set or reset one or a plurality of settings of the Priorities/Filters boundary 9735, such as described in FIG. 125 and elsewhere.

After an inbound connection request 9734 has passed through the Priorities/Filters boundary 9736 and been included in a SPLS connection 9745 at the appropriate priority level 9737 9740 9745 or filtering level 9741 9740 9745, it is utilized in the default manner prescribed 9748. In some examples the default 9748 is to accept the action(s) of the Priorities/Filters boundary 9736 as presented and utilize the inbound connection request 9734 as presented 9745. In some examples the default setting is to utilize the inbound connection request 9734 as presented 9745, but then move it to a different priority level 9737 or a different filter level 9741 by editing the Priorities/Filters boundary settings 9735. In some examples the default setting is to utilize the inbound connection request 9734 as presented 9745, but then then edit the categories or items prioritized 9737 and filtered 9741 in some examples by promoting them 9735, in some examples by denoting them 9735, in some examples by renaming them 9735, in some examples by a deletion(s) 9735, in some examples by blocking an item, source, or category 9735, in some examples by editing a category's items 9735, etc. In each case, the user may set or reset and save the default state 9749.

TP protection services—individuals, groups, public: In some examples as part of accepting an inbound Shared Space connection FIG. 115 SPLS Boundary Management Services 4905 may determine whether or not a recognized and known inbound connection request 4904 needs to be approved or processed by that SPLS's Protection boundary 4915, and if so the appropriate Protection boundary 4916 is invoked 9766 9768 9770 9772 in FIG. 121. In some examples a new inbound Shared Space connection FIG. 116 may identify a new inbound connection request 4930 4931 4932 and determine that it needs to be approved or processed by the Protection boundary 4944 and if so the appropriate Protection boundary 4950 is invoked 9766 9768 9770 9772. Turning now to FIG. 121, "TP Protection Services: Individuals, Groups, Public" in some examples a known inbound connection request 9764 is received from boundaries such as SPLS Boundary Management Services 9760, and in some examples a new inbound connection request 9764 is received from boundaries such as new inbound connection requests 9761. In some examples an option (at any time) is to set or reset one or a plurality of settings of the Protection boundary 9765, such as described in FIG. 125 and elsewhere.

In some examples a Protection boundary deals with aspects of the digital protection of individuals 9766, groups 9768, and the public 9770. In some examples a Protection boundary deals with aspects of the physical protection of individuals 9766, groups 9768, and the public 9770. In some examples the Protection of an individual 9766 includes the digital and physical protection of a plurality of their identities. In some examples the Protection of an individual 9766 includes the digital and physical protection of their family and household. In some examples the inbound connection request 9764 is for an individual 9766, one identity 9766, a plurality of identities 9766, a family 9766, a household 9766, or additional houses or households of said individuals or identities 9766; and if inbound connection request 9764 needs to be approved or processed by the Protection boundary for Individuals 9766 then check the inbound connection request 9764 by the TP Protection boundary for Individuals 9781 in FIG. 122. In some examples the inbound connection request 9764 is for a group 9768; and if inbound connection request 9764 needs to be approved or processed by the Protection boundary for Groups 9768 then check the inbound connection request 9764 by the TP Protection boundary for Groups 9801 in FIG. 123. In some examples the inbound connection request 9764 is for the public 9770; and if inbound connection request 9764 needs to be approved or processed by the Protection boundary for the Public 9770 then check the inbound connection request 9764 by the TP Protection boundary for the Public 9825 in FIG. 124.

In some examples it may not be clear whether an inbound connection request 9764 that needs to be approved or processed by the protection boundary applies to a person 9766, a group 9768 or the public 9770; so if inbound connection request 9764 needs to be clarified then apply the currently set default action 9772 for determining unclear Protection requirements for inbound connection requests 9764. In some examples the default 9772 is to (optionally) manually review said unclear inbound connection request 9764 to determine the appropriate Protection boundary 9766 9768 9770. In some examples the default 9772 is to (optionally) interact with the source of the unclear inbound connection request 9764 to determine the appropriate Protection boundary 9766 9768 9770. In some examples the default 9772 is to (optionally) interact with the receiving identity to determine the appropriate Protection boundary 9766 9768 9770. In some examples the default setting is to not reply and maintain stealth by not acknowledging existence in any way 9773. In some examples the default setting is to determine if any of the one's other identities have previously accepted and approved the current inbound connection request 9764 or source 9764, and if so treat this request with the same level of protection as previously determined and applied. In each case, the user may set or reset and save the default state 9773.

TP protection services—individuals (prioritize, filter, reject, block/protect): Some examples in FIG. 122, "TP Protection Services: Individuals (Reject, Filter, Block/Protect)" illustrate the Protection of an Individual 9766 in FIG. 121, which includes some aspects of the digital and physical protection of an individual, a plurality of identities, a residence, or additional physical locations or residences of said individual—an inbound connection request for either physical entry or digital entry may be approved or processed by the Protection boundary for Individuals 9781 9783 in FIG. 122. Said inbound connection request may include IPTR (an Identity [or person], Place, Tool, Resource, etc.). In addition to digital protection the TP's SPLS Protection boundary includes physical protection that is under the control of each Individual throughout a plurality of physical locations where each Individual desires and chooses to add physical protection. In some examples an Individual's protected locations may be a residence(s). In some examples an Individual's protected locations may be a vehicle(s). In some examples an Individual's protected locations may be a residence(s). In some examples an Individual's protected locations may be an office(s). In some examples an Individual's protected locations may be a business(s). In some examples an Individual's protected location(s) may be inside another unprotected location(s). In some examples an Individual's protected locations may be a more protected area(s) inside one or a plurality of its protected location(s). In some example's a third-party service organization may provide one or a plurality of TP Protection Service(s) for one or a plurality of an Individual's locations. Therefore in some examples the TP's SPLS Protection boundary may serve to provide safer Shared Planetary Life Spaces for an Individual that includes multiple locations—and does so by means that are under the control of each Individual, and by means that each Individual may (optionally) buy from one or a plurality of third-party services. In some examples physical protection is initiated with biometric identification of a plurality of members of the public 4939 in FIG. 116 by means of the TP Identification Service 4932, automated Directory lookup 4936, automated standard profiling 4940, or optional classification 4943 and/or valuing 4943. In some examples said identifications 4932 4939 is often simplified by an Individual's SPLS(s) lists, user profile data, Protection data and other stored data and lists which provide rapid "whitelist" identification and "blacklist" identification of the Individual's familiar IPTR contacts, whether physical or digital. Therefore in some examples the TP's SPLS Protection boundary may serve to provide safer Shared Planetary Life Spaces for Individuals that simultaneously include both their digital and physical "life spaces"—and do so by means that are under the control of each Individual so the security, privacy and protection of each of an Individual's multiple SPLS "life spaces" reflects the personal choices of each Individual—with some SPLS's having considerably greater protection than others, even if they are in the same physical location(s).

In some examples inbound connection request 9764 has arrived at said Protection boundary for Individuals 9783 because it has not been accepted or approved as a connection by SPLS Boundary Management Services 4905 in FIG. 115, and also has not been identified as an authorized connection by TP identification service 4932 in FIG. 116, which has also acquired Directory(ies) profile information 4940 4941, (optional) classification 4943, and (optional) valuation 4943. Receiving identity in an identity's (or an individual's) SPLS has had an opportunity to review 4944 said inbound connection request and determined that it is not accepted for connection. In some examples said TP Protection boundary for Individuals may be invoked immediately during said review 4944 by providing a range of immediate choices such as reject 9784, filter 9784, Paywall 9784, block 9784, or protect 9784. In some examples said TP Protection boundary for Individuals may be invoked immediately during said review 4944 by providing the immediate choice of reject 9784. In some examples said TP Protection boundary for Individuals may be invoked immediately during said review 4944 by providing the immediate choice of filter 9784. In some examples said TP Protection boundary for Individuals may be invoked immediately during said review 4944 by providing the immediate choice of Paywall 9784. In some examples said TP Protection boundary for Individuals may be invoked immediately during said review 4944 by providing the immediate choice of block 9784. In some examples said TP Protection boundary for Individuals may be invoked immediately during said review 4944 by providing the immediate choice of protect 9784. In some examples said TP Protection boundary for Individuals may be invoked immediately during said review 4944 by providing the immediate choice that protection is not needed 9784, and if that is selected 9796 9797 this process continues 4905 FIG. 115. In some examples said choices of reject 9784, filter 9784, Paywall 9784, block 9784, or protect 9784 may be applied to a plurality of identities.

In some examples the choice to reject 9784 9785 is made and the inbound connection request is rejected from said identity's SPLS (Shared Planetary Life Spaces) 9785. In some examples the choice to reject 9784 9785 is made and the inbound connection request is not added to said identity's lists of acceptable connections 9785. In some examples the choice to reject 9784 9786 is made and the inbound connection request is rejected without any reply or response 9786; that is, a "stealth" mode is used which is complete non-existence with no replies, no responses no acknowledgements, etc. for any reason. In some examples the choice to reject 9784 9786 is made and the inbound connection request is rejected with a reply 9786 that may be chosen by selecting among pre-written "canned" replies, or may be a custom written reply; in some examples a pre-written reply may inquire about the need for a contact; in some examples a custom reply may suggest availability for a connection on a specific date and time. In some examples the choice to reject 9784 is made and the response may be a combination of rejection from said identity's SPLS 9785, not being added to said isdentity's lists of acceptable connections 9785, a "stealth" non-response 9786, or a reply with a rejection message 9786. In some examples the choice to filter 9784 9787 is made and the inbound connection request is written to the Priorities/Filters database(s) 9738 in FIG. 120 where it will be appropriately retrieved by the Priorities/Filters boundary 9737 9741 9738. In some examples the choice to add to a Paywall 9784 9787 is made and the inbound connection request is written to the Paywall data database(s) 4968 in FIG. 117 where it will be appropriately retrieved by the Paywall boundary 4967 4968. In some examples the choice to block 9784 9789 is made and the inbound connection request is added to a "block" list 9789 in a Protection database(s) 9792. In some examples the choice to block 9784 9790 is made and the inbound connection request is rejected without any reply or response 9790; that is, a "stealth" mode is used which is complete non-existence with no replies, no responses no acknowledgements, etc. for any reason. In some examples the choice to block 9784 9790 is made and the inbound connection request is rejected with a reply 9790 that may be chosen by selecting among pre-written "canned" replies, or may be a custom written reply. In some examples the choice to block 9784 9791 is made and the currently set default action 9791 is taken. In some examples the default 9791 is to add the inbound connection requests to the "block" list 9789 in a Protection database(s) 9792. In some examples the default 9791 is to not reply but instead assume "stealth" mode which is complete non-existence with no replies, no responses no acknowledgements, etc. for any reason. In each case, the user may set or reset and save the default state 9791.

In some examples the choice to protect 9784 9793 is made and the inbound connection request is added to a "watch" list 9793 in a Protection database(s) 9792. In some examples the inbound connection request has been added to a Protection database(s) 9792 and said inbound connection request is attempted repeatedly by physical means 9793, so in subsequent physical entry attempts data should be recorded 9793 which may optionally include data such as camera image(s), audio recording(s), identity, event, date, timestamp, devices used, addresses if known, details of event, sequence of actions, etc. In some examples the inbound connection request has been added to a Protection database(s) 9792 and said inbound connection request is attempted repeatedly by digital means 9793, so in subsequent inbound digital connection attempts data should be recorded 9793 which may optionally include data such as identity, event, date, timestamp, devices used, addresses if known, details of event, sequence of actions, etc. In some examples selecting one or a plurality of blocking options 9789 9790 9790 automatically includes one or a plurality of protection choices 9793 9794 9795. In some examples the choice to protect 9784 9794 is made and the inbound connection request is added to an alerts list 9794 in a Protection database(s) 9792. In some examples the subsequent instances of physical entry attempts 9794 from the same inbound connection requestor are recorded in said Protection database(s) 9792 along with means to escalate said alerts at each subsequent attempted physical entry; in some examples, a first alert could notify you and others on an "alert list" 9794; a second alert could notify a security service 9794; a third alert could request immediate security assistance 9794; a fourth alert could notify police and request police assistance 9794; etc. In some examples the subsequent instances of digital entry attempts 9794 from the same inbound connection requestor are recorded in said Protection database(s) 9792 along with means to escalate said alerts at each subsequent attempted digital entry; in some examples, a first alert could notify you and others on an "alert list" such as appropriate service vendors 9794; a second alert could notify a computer security service 9794; a third alert could request immediate computer security assistance 9794; a fourth alert could notify police and request police assistance 9794; etc. In each case, the user may set or reset and save the alerts list 9794 to alter various characteristics in some examples the number of alerts, in some examples the severity of alerts, in some examples those who are alerted, etc. In some examples the choice to protect 9784 9795 is made and the inbound connection request is added to an action responses list 9794 in a Protection database(s) 9792. In some examples the subsequent instances of physical entry attempts 9795 from the same inbound connection requestor are recorded in said Protection database(s) 9792 along with means to escalate said action responses at each subsequent attempted physical entry; in some examples a physical action is to ring a security alarm 9795 and notify a security service 9795; a personal action is a panic alarm on a TP Device 9795; an alarm action is to auto-request security assistance at an alarm event 9795. In some examples selecting one or a plurality of protect options 9793 9794 9795 automatically includes one or a plurality of blocking choices 9789 9790 9790.

TP protection services—groups (prioritize, filter, reject, block/protect): Some examples in FIG. 123, "TP Protection Services: Groups (Reject, Filter, Block/Protect)" illustrate the Protection of a Group 9768 in FIG. 121, which includes some aspects of the digital and physical protection of a group, its locations, its places, its internal members, its employees, its external members, its tools, its resources, etc.—an inbound connection request for either physical entry or digital entry may be approved or processed by the Protection boundary for Groups 9801 9803 9804 9811 in FIG. 123. Said inbound connection request may include any IPTR (an Identity [or person], Place, Tool, Resource, etc.). In addition to digital protection the TP's SPLS Protection boundary includes physical protection that is under the control of each Group throughout a plurality of physical locations where physical protection is desired and instantiated. In some examples a Group's protected locations may be an office(s). In some examples a Group's protected locations may be a building(s). In some examples a Group's protected locations may be a higher security area(s) inside one or a plurality of its protected building(s). In some examples a Group's protected locations may be a warehouse(s) or other storage, distribution or logistics facility. In some examples a Group's protected locations may be a vehicle(s) such as automobiles, buses, trucks, train cars, airplanes, etc. In some examples a Group's protected locations may be another type of physical facility (ies). In some example's a third-party service organization may provide one or a plurality of TP Protection Service(s) for one or a plurality of a Group's locations. Therefore in some examples the TP's SPLS Protection boundary may serve to provide safer Shared Planetary Life Spaces for a Group that includes multiple locations—and does so by means that are under the control of each Group, and by means that each Group may (optionally) buy from one or a plurality of third-party services. In some examples physical protection is initiated with biometric identification of a plurality of members of the group and public 4939 in FIG. 116 by means of the TP Identification Service 4932, automated Directory(ies) lookup 4936, automated profiling 4940, or optional classification 4943 and/or valuing 4943. In some examples said identifications 4932 4939 are often simplified by a Group's SPLS(s) lists, internal directory(ies), employee profile data, contractor identification data, Protection data and other stored data and lists which provide rapid "whitelist" identification and "blacklist" identification of the Group's known IPTR contacts, whether physical or digital. Therefore in some examples the TP's SPLS Protection boundary may serve to provide safer Shared Planetary Life Spaces for Groups that simultaneously include both their digital and physical "life spaces"—and do so by means that are under the control of each Group so the security, privacy and protection of each of their multiple SPLS "life spaces" reflects the management decisions of each Group—with some SPLS's having considerably greater protection than others, even if they are in the same physical location(s).

In some examples inbound connection request 9764 has arrived at said Protection boundary for Groups because it has not been accepted or approved as a connection by SPLS Boundary Management Services 4905 in FIG. 115, and also has not been identified as an authorized connection by TP identification service 4932 in FIG. 116, which has also acquired Directory(ies) profile information 4940 4941, (optional) classification 4943, and (optional) valuation 4943. Receiving identity at a Group SPLS has had an opportunity to review 4944 said inbound connection request and determined that it is not accepted for connection. In some examples said TP Protection boundary for the Group may be invoked immediately during said review 4944 by providing a range of immediate choices such as reject and block 9805 9807 9808, filter 9805 9806, Paywall 9805 9806, or protect 9811 9812 9813 9814 9815 9816. In some examples said TP Protection boundary for Individuals may be invoked immediately during said review 4944 by providing the immediate choice of reject and block 9805 9807 9808. In some examples said TP Protection boundary for Individuals may be invoked immediately during said review 4944 by providing the immediate choice of filter 9805 9806. In some examples said TP Protection boundary for Individuals may be invoked immediately during said review 4944 by providing the immediate choice of Paywall 9805 9806. In some examples said TP Protection boundary for Individuals may be invoked immediately during said review 4944 by providing the immediate choice of protect 9811 9812 9813 9814 9815 9816. In some examples said TP Protection boundary for Individuals may be invoked immediately during said review 4944 by providing the immediate choice that protection is not needed 9817, and if that is selected 9817 9818 then this process continues 4905 FIG. 115. In some examples said choices of reject and block 9805 9807 9808, filter 9805 9806, Paywall 9805 9806, or protect 9811 9812 9813 9814 9815 9816 may be applied to a plurality of a Group's SPLS's.

In some examples a digital inbound connection request is already on a watch list 9803 in a Protection database(s) 9819 where it will be appropriately retrieved by the Protection boundary 9803 in which case it may be filtered 9804, Paywalled 9804, rejected 9804 and/or blocked 9804. In some examples a physical inbound connection request is already on a watch list 9803 in a Protection database(s) 9819 where it will be appropriately retrieved by the Protection boundary 9803 in which case it may be filtered 9804, Paywalled 9804, rejected 9804 and/or blocked 9804. In some examples a digital inbound connection request is already on a block list 9803 in a Protection database(s) 9819 where it will be appropriately retrieved by the Protection boundary 9803 in which case it may be filtered 9804, Paywalled 9804, rejected 9804 and/or blocked 9804. In some examples a physical inbound connection request is already on a block list 9803 in a Protection database(s) 9819 where it will be appropriately retrieved by the Protection boundary 9803 in which case it may be filtered 9804, Paywalled 9804, rejected 9804 and/or blocked 9804. In some examples a digital inbound connection request is already on a watch list 9803 in a Protection database(s) 9819 where it will be appropriately retrieved by the Protection boundary 9803 in which case it may be protected from 9811. In some examples a physical inbound connection request is already on a watch list 9803 in a Protection database(s) 9819 where it will be appropriately retrieved by the Protection boundary 9803 in which case it may be protected from 9811. In some examples a digital inbound connection request is already on a block list 9803 in a Protection database(s) 9819 where it will be appropriately retrieved by the Protection boundary 9803 in which case it may be protected from 9811. In some examples a physical inbound connection request is already on a block list 9803 in a Protection database(s) 9819 where it will be appropriately retrieved by the Protection boundary 9803 in which case it may be protected from 9811.

In some examples the choice to reject and block 9805 9807 is made and the inbound connection request is rejected and blocked from said group's SPLS (Shared Planetary Life Spaces) 9807, and is added to a block list(s) in said group's Protection database(s) 9819. In some examples the choice to reject and block 9805 9807 is made and the inbound connection request is rejected and blocked from said group's SPLS (Shared Planetary Life Spaces) 9807, and is added to a watch list(s) in said group's Protection database(s) 9819. In some examples the choice to reject and block 9805 9807 is made and the inbound connection request is not added to said group's lists of acceptable connections 9807 in said group's Protection database(s) 9819. In some examples the choice to reject and block 9805 9807 is made and the inbound connection request is rejected without any reply or response 9808; that is, a "stealth" mode is used which is complete non-existence with no replies, no responses no acknowledgements, etc. for any reason. In some examples the choice to reject and block 9805 9807 is made and the inbound connection request is rejected with a reply 9808 that may be chosen by selecting among pre-written "canned" replies, or may be a custom written reply; in some examples a pre-written reply may inquire about the purpose of a connection; in some examples a custom reply may suggest availability of a connection on a specific date and time. In some examples the choice to reject and block 9805 9807 is made and the response may be a combination of rejection and blocking from said group's SPLS 9807, not being added to said group's lists of acceptable connections 9807, a "stealth" non-response 9808, or a reply with a rejection message 9808 or custom message 9808.

In some examples the choice to filter 9805 9806 is made and the inbound connection request is written to the Priorities/Filters database(s) 9738 in FIG. 120 where it will be appropriately retrieved by the Priorities/Filters boundary 9737 9741 9738. In some examples the choice to add to a Paywall 9805 9806 is made and the inbound connection request is written to the Paywall data database(s) 4968 in FIG. 117 where it will be appropriately retrieved by the Paywall boundary 4967 4968. In some examples the choice to reject and block 9805 9807 9808 is made and the currently set default action 9807 is taken. Regardless of what the default setting is, a group may set or reset and save the default action 9805 9807 9808. In some examples using one or a plurality of reject and block options 9805 9807 9808 completes this process 9810; at which point various event data may be logged and/or stored in said group's Protection database(s) 9819, such as event date, timestamp, identity(ies), device(s) used, entry location, entry means, etc. In some examples selecting one or a plurality of reject and block options 9805 9807 9808 automatically 9809 or manually 9809 includes one or a plurality of protection choices 9811 9812 9813 9814 9815 9816.

In some examples the choice to protect 9811 9812 is made and the inbound connection request is added to a "permanent block" list 9812 in a Protection database(s) 9819. In some examples the choice to protect 9811 9813 is made and the inbound connection request is rejected without any reply or response 9813; that is, a "stealth" mode is used which is complete non-existence with no replies, no responses no acknowledgements, etc. for any reason. In some examples the choice to protect 9811 9813 is made and the inbound connection request is rejected with a reply 9813 that may be chosen by selecting among pre-written "canned" replies, or may be a custom written reply; in some examples a pre-written reply may provide notification of a permanent block; in some examples a custom reply may suggest never attempting another connection. In some examples the inbound connection request has been added to a Protection database(s) 9819 for permanent blocking 9812 which includes permanent watching 9812 and permanent recording 9814 so if said inbound connection request is attempted subsequently by physical means 9814, then in subsequent physical entry attempts data is recorded 9814 which may optionally include data such as camera image(s), audio recording(s), identity, event, date, timestamp, devices used, addresses if known, details of event, sequence of actions, automatic tracking of an attempted physical entry across multiple cameras and microphones, etc. In some examples the inbound connection request has been added to a Protection database(s) 9819 for permanent blocking 9812 which includes permanent watching 9812 and permanent recording 9814 so if and said inbound connection request is attempted subsequently by digital means 9814, then in subsequent inbound digital connection attempts data is recorded 9814 which may optionally include data such as identity, event, date, timestamp, devices used, addresses if known, details of event, sequence of actions, etc. In some examples the choice to protect 9811

9815 is made and the inbound connection request is added to an alerts list 9815 in a Protection database(s) 9819. In some examples the subsequent instances of physical entry attempts 9812 9814 from the same inbound connection requestor are recorded in said Protection database(s) 9819 along with means to escalate said alerts at each subsequent attempted physical entry; in some examples, a first alert of a physical entry attempt could notify local personnel and others on an "alert list" 9815; a second alert could notify a security escalation service 9815; a second alert could also provide priority security display of said physical entry attempt 9815; a third alert could request immediate security assistance 9815; a fourth alert could notify police and request police assistance 9815; etc. In some examples the subsequent instances of digital entry attempts 9812 9814 from the same inbound connection requestor are recorded in said Protection database (s) 9819 along with means to escalate said alerts at each subsequent attempted digital entry; in some examples, a first alert of a digital entry attempt could notify network security personnel and others on an "alert list" such as appropriate service vendors 9815; a second alert could notify a computer security special service 9815; a second alert could also provide priority real-time security display of said digital entry attempt 9815; a third alert could request immediate priority computer security assistance 9815; a fourth alert could notify police and request police assistance 9815; etc. In each case, the group may set or reset and save the alerts escalation policies and/or alerts list 9815 to alter various characteristics in some examples the number of alerts, in some examples the severity of alerts, in some examples those who are alerted, etc. In some examples the choice to protect 9811 9816 is made and the inbound connection request is added to an action responses list 9816 in a Protection database(s) 9819 for permanent watching 9812 and permanent recording 9814 so if said inbound connection request is attempted subsequently by physical means 9816, then in subsequent physical entry attempts means are included for responsive actions 9816. In some examples said action responses are escalated at each subsequent attempted physical entry 9816; in some examples a physical action is to ring a security alarm 9816 and notify local security personnel 9816; in some examples a personal action is to set off a panic alarm on a TP Device 9816; in some examples an alarm action is to auto-request security assistance at an alarm event 9816. In each case, the group may set or reset and save the actions response escalation policies and/or actions list 9816 to alter various characteristics in some examples the type(s) of alarms such as silent and/or audible, in some examples the type(s) of personnel notified immediately; in some examples the type(s) of actions automatically expected from those who are notified for each type alarm(s), etc. In some examples selecting one or a plurality of protection options 9811 9812 9813 9814 9815 9816 automatically includes one or a plurality of other protection choices 9811 9812 9813 9814 9815 9816.

TP protection services—public (value, act, protect): Some examples in FIG. 124, "TP Protection Services: Public (Value, Serve, Protect)" illustrate the Protection of parts of the Public 9770 in FIG. 121, which includes some aspects of the digital and physical protection of parts of the public, some locations, some places, some of its public organizations' locations, some of its public businesses' locations, some of its people, its tools, its resources, etc.—an inbound connection request for either physical entry or digital entry may be approved or processed by the Protection boundary for Public 9832 9838 9843 in FIG. 124. Said inbound connection request may include any IPTR (an Identity [or person], Place, Tool, Resource, etc.). In some examples a Public TP Protection boundary differs from an Individual's Protection boundary FIG. 122 and a Group's Protection boundary FIG. 123 because of an increased emphasis on public physical protection in a plurality of physical locations where increased physical protections are desired and instantiated by each location, whether they provide this directly or whether this is bought from a third-party security service. In some examples an organization's public locations may be a chain of mall stores or free-standing "big box" stores. In some examples an organization's public locations may be one or a plurality of hospitals or medical facilities. In some examples an organization's public locations may be government buildings. In some examples an organization's public locations may be schools (both K-12 public schools and public universities). In some examples an organization's public locations may be transportation facilities such as airports. In some examples an organization's public locations may be mobile such as on board buses and subway cars. In some examples an organization's public locations may be public sidewalks and traffic light intersections throughout a municipal district. In some examples an organization's public locations may be stadiums or arenas. In some examples an organization's public locations may be an state's monitored toll highways, or a nation's interstate highway system. In some examples a third-party service organization may provide one or a plurality of TP Protection Service(s) for one or a plurality of organization's public locations. Therefore in some examples the TP's SPLS Protection boundary may serve to provide safer Shared Planetary Life Spaces for the public that includes its physical "public life spaces"—and does so by means that are under the control of each organization whose public space(s) are at risk, and by means that each organization can (optionally) buy from one or a plurality of third-party services. In some examples the security, privacy and protection of each organization's multiple SPLS "life spaces" reflects the choices of each organization—with some SPLS's having considerably greater protection than others, based on those separate and independent choices.

In some examples a member of the public has arrived at said Protection boundary for the Public because it is entering a particular physical location such as a store, a government building, an airplane, etc. In some examples a member of the public is merely present within a protected public space because the person is in a particular location such as an airport, a mall store, an airplane, at a busy city street corner like Times Square New York, etc. In some examples physical protection is initiated with biometric identification of a plurality of members of the public 4939 in FIG. 116 by means of the TP Identification Service 4932, automated Directory lookup 4936, automated standard profiling 4940, or optional classification 4943 and/or valuing 4943. In some examples said identifications 4932 4939 may be simplified by a public organization's SPLS(s) lists, user profile data, Protection data and other stored data and lists which provide rapid "whitelist" identification and "blacklist" identification of that organization's known IPTR contacts, whether physical or digital. In some example's a third-party service organization may provide one or a plurality of said organizational "whitelists" and/or "blacklists" as part of the TP Protection Service(s) to sells to one or a plurality of organization's public locations. In some example's a third-party service organization may provide one or a plurality of generalized "whitelists" and/or "blacklists" as part of the TP Protection Service(s) it sells to one or a plurality of organization's public locations.

Regardless of the location and timing of said TP Protection identification, in some examples the only identification is performed to determine whether or not a person [or identity]

is on a watch list 9828 by means of one or a plurality of Protection database(s) 9838, and those who are not on a watch list 9828 are ignored. Similarly, in some examples the identification is performed to determine whether or not a person [or identity] is on a block list 9828 by means of one or a plurality of Protection database(s) 9838, and those who are not on a block list 9828 are ignored. In some examples when a person [or identity] is on a watch list 9828 9838 or is on a block list 9828 9838, the identification is employed for further acquisition of Directory(ies) profile information 4940 4941 in FIG. 116, (optional) classification 4943, and (optional) valuation 4943 as described elsewhere. In some examples when a person [or identity] is on a watch list 9828 9838 or is on a block list 9828 9838, the identification is employed for protection 9853 9844 9845 9846 9847 9848. In some examples the choice to protect 9853 9844 is made for a plurality of person(s) [or identity(ies)] who are on a "watch" list 9838 or on a "block" list 9838 in a Protection database(s) 9838. In some examples those person(s) [or identity(ies)] 9828 are saved to that organization's or public place's local "watch" list 9844 9838 or "block" list 9844 9838 for faster future identifications (under the assumption that once a person 9828 is physically present in a public location, they are likely to return there again). In some examples the choice to protect 9853 9845 includes tracking the appearances of those person(s) [or identity(ies)] 9828 in that public place(s) by identifying 9845, tracking 9845, watching 9845 those person (s) by means of a plurality of RTPs 9845, cameras 9845, etc. as they move through the public space. In some examples the choice to protect 9853 9845 includes tracking the appearances of those person(s) [or identity(ies)] 9828 in that public place(s) by alerting staff 9845 and displaying those person(s) on staff's current TP devices 9845. In some examples the choice to protect 9853 9845 includes tracking the appearances of those person(s) [or identity(ies)] 9828 in that public place(s) by alerting remote security services 9845 and displaying those person(s) at said remote security service(s) 9845 as those person(s) move through the public space. In some examples the choice to protect 9853 9846 includes tracking the appearances of those person(s) [or identity(ies)] 9828 in that public place(s) by recording 9846 during initial entry(ies) 9846, subsequent entry(ies) 9846, and during physical presence(s) 9846; recorded data 9846 may optionally include data such as video, camera image(s), audio recording(s), identity, event(s), date(s), timestamp(s), devices used, addresses if known, details of event(s), sequence(s) of actions, automated tracking across multiple cameras and microphones, etc. In some examples the choice to protect 9853 9847 includes tracking the appearances of those person (s) [or identity(ies)] 9828 in that public place(s) by adding them when they appear to an alerts list 9847 in a Protection database(s) 9838. In some examples a hospital or medical facility may have identified a known drug offender who has repeatedly taken addictive drugs. In some examples a retail chain may have identified a known shoplifter(s) who has repeatedly taken merchandise. In some examples the subsequent instances of physical entries 9853 9847 and/or physical appearances 9853 9847 in that public place(s) include means to escalate said alerts at each subsequent physical appearance 9847; in some examples, a first alert of a physical entry attempt could notify local staff and others on an "alert list" 9847; a second alert could notify a security escalation service 9847; a second alert could also provide priority security display of said physical entry 9847 at local and/or remote security services; a third alert could request immediate security assistance 9847; a fourth alert could notify police and request police assistance 9847; etc. In each case, the public organization may set or reset and save the alerts escalation policies and/or alerts list 9847 to alter various characteristics in some examples the number of alerts, in some examples the severity of alerts, in some examples those who are alerted, etc. In some examples the choice to protect 9853 9848 includes tracking the appearances of those person(s) [or identity(ies)] 9828 in that public place(s) by adding them when they appear to an action response list 9848 in a Protection database(s) 9838; then in initial entry 9848, in subsequent entries 9848, and during physical presence(s) 9848 means are included for responsive actions 9848. In some examples said action responses are escalated at each subsequent attempted physical entry 9848; in some examples a physical action is to ring a silent security alarm 9848 and notify local employees 9848; in some examples a physical action is to notify local security personnel 9848; in some examples a personal action is to ring a panic alarm on a TP Device 9816 that notifies other employees 9848 or local security staff 9848; in some examples an action response is to auto-request security assistance to be present in the vicinity of those person(s) 9828. In each case, the public organization may set or reset and save the actions response escalation policies and/or actions list 9848 to alter various characteristics in some examples the type(s) of alarms such as silent and/or audible, in some examples the type(s) of employees and/or security personnel notified immediately; in some examples the type(s) of actions automatically expected from those who are notified for each type alarm(s), etc. In some examples selecting one or a plurality of protection options 9853 9844 9845 9846 9847 9848 automatically includes one or a plurality of other protection choices 9853 9844 9845 9846 9847 9848.

In some examples a member of the public has arrived at said Protection boundary for the Public because it is entering a particular protected location; and in some examples a member of the public is merely present within a protected public space; regardless of the location and type of appearance, in some examples the identification is performed to classify a plurality of members of the public 9827 as described elsewhere. Similarly, in some examples the identification is performed to value a plurality of members of the public 9827 as described elsewhere. In some examples no classification 9827 and no valuation 9827 might be performed on a plurality of members of the public. In some examples manual classification 9827 and/or manual valuation 9827 might be performed on a plurality of members of the public. In some examples automated classification 9827 and/or automated valuation 9827 might be performed on a plurality of members of the public. The wide range of means by which classification 9827 and/or valuation 9827 may be instantiated are described elsewhere. In some examples all classification labels 9827 9829 9830 9831 9832 and/or all valuation labels 9827 9829 9830 9831 9832 may be named by using standard political correctness or "PC" so that all labels are positive and praise every person, without regard for any real meaning or resulting action(s). In some examples a system of classification 9827 and/or system of valuation 9827 may reflect a specific type of ranking system to fit specific purposes, regardless of the names or labels used to name the classifications or valuations. In some examples the ranking may be in quintiles such as 81% to 100% equals "best" 9829, 61% to 80% equals "positive" 9829, 41% to 60% equals "good" 9830, 21% to 40% equals "superlative" 9831, and 1% to 20% equals "special" 9832 in which "special" 9832 does not mean lowest, bottom, dangerous, threat, etc.—essentially no term ever means anything negative but a given term (such as "special") might merely indicate a mismatch between a person's suitability for a particular type of public location (such as a high-end jewelry store that sells only diamonds and gold, so about 90% of the population might be classified in various types of less suitable categories and valuations). In some examples all chosen labels fit standard marketing practices for positive, cheerful and motivating names, enabling both dystopian and utopian cynicism about naming systems where everyone is special.

In some examples said classification 9827 9829 9830 9831 9832 and/or valuation 9827 9829 9830 9831 9832 provide different in-person treatments (including both in-person treatments and personal digital communications) for those in different categories 9827 9829 9830 9831 9832. In some examples said classification 9827 9829 9830 9831 9832 and/or valuation 9827 9829 9830 9831 9832 provide different automated business processes (including both in-person automation and digital marketing and sales automation) for those in different categories 9827 9829 9830 9831 9832.

In some examples those classified 9827 9829 at the top 9829 or near the top 9829 may receive one type of treatment 9829 9851 9833 9834 9835 9836 9837 in some examples preferential treatment. In some examples a physically present person in more than one category 9829 9851 may receive the same type of treatment, in some examples preferential treatment. In some examples a physically present person [or identity] in these categories 9829 9851 9833 has been valued 9833 and profiled 9833 and is contacted personally to learn their actual focus 9833, interests 9833, needs 9833, etc. and interact 9833. In some examples that person [or identity] may be added to one of the organization's public SPLS 9833 in some examples an SPLS for its "high-value connections." In some examples that person [or identity] may be added to the organization's local lists 9833 for faster future identifications. In some examples that person's [or identity's] interests 9833, needs 9833, etc. may be added to the organization's personal profile 9833 for better and more accurate future service. In some examples that person [or identity] may be identified sooner 9834 when they return to that location 9834, or to another of that organization's public locations 9834. In some examples that returning person [or identity] may be identified more quickly 9835, their previous interests retrieved 9833 9835, their profile updated from the appropriate Directory (ies) 9835, and their relationship history 9835 retrieved. In some examples that returning person [or identity] may have their record displayed for the organization's staff 9836. In some examples that organization's systems may provide its staff with recommendations 9836 personalized for that returning person [or identity]. In some examples that returning person [or identity] may be contacted personally by staff 9836 to confirm their interests 9836, attempt closure on meeting their needs 9836, and record the results 9836. In some examples that returning person [or identity] may have the organization determine appropriate next steps 9837, set up systematic communications 9837, arrange SPLS prime services 9837, or start integrating them into the organization's SPLS 9837.

In some examples those classified 9827 9830 in the middle 9830 may receive one type of treatment 9830 9852 9839 9840 9841 9842 in some examples good treatment. In some examples those classified 9827 9831 just below the middle 9831 may receive one type of treatment 9831 9852 9839 9840 9841 9842 in some examples good treatment. In some examples a physically present person in more than one category 9830 9831 9852 may receive the same type of treatment, in some examples good treatment. In some examples a physically present person [or identity] in these categories 9830 9831 9852 9839 has been valued 9839 and profiled 9839 and is contacted personally to interact 9839 learn their interest 9839 and attempt closure 9839. In some examples that person [or identity] may be determined as valuable 9839 and added to one of the organization's public SPLS 9839 9840 in some examples an SPLS for its "good connections.". In some examples that person [or identity] may be added to the organization's local lists 9839 for faster future identifications. In some examples that person's [or identity's] interests 9839, needs 9839, etc. may be added to the organization's personal profile 9839 for future retrieval and use. In some examples that person [or identity] may be identified sooner 9841 when they return to that location 9841, or to another of that organization's public locations 9841. In some examples that returning person [or identity] may be identified more quickly 9842, their previous interests retrieved 9839 9842, their profile updated from the appropriate Directory(ies) 9842, and their relationship history 9842 retrieved. In some examples that returning person [or identity] may have their record displayed for the organization's staff 9842. In some examples that organization's systems may provide its staff with recommendations 9842. In some examples that returning person [or identity] may be contacted personally by staff 9842 to confirm their interests 9842, attempt closure 9842, and record the results 9842. In some examples that returning person [or identity] may have the organization determine appropriate next steps 9842, set up systematic communications 9842, arrange SPLS connections 9842, or start integrating them into the organization's SPLS communications 9842.

In some examples those classified 9827 9832 near the bottom 9832 may receive one type of treatment 9832 9853 that may differ from those who are in different classifications 9829 9830 9831 or in different valuations 9829 9830 9831. In some examples those at or near the bottom 9832 receive more. In some examples a public school may provide many more services and SPLS connections to those who are classified near the bottom 9832 9853 than to those who are classified near the top 9829 9830 9831. In some examples this bottom-up pattern may have a government agency provide more services and SPLS connections to those who are classified near the bottom 9832 9853 than to those who are classified near the top 9829 9830 9831. In some examples this bottom-up pattern may have a charity or non-profit organization provide more services and SPLS connections to those who are classified near the bottom 9832 9853 than to those who are classified near the top 9829 9830 9831. In some examples an equitable pattern may have a religious group provide a distribution of services and SPLS connections to those who are classified at all levels, from the bottom 9832 to the middle 9830 9831 to the top 9829 9830 9831. Thus, TP Protection Services for the Public may offer numerous instances in which those near the bottom 9832 are not overlooked—but on the contrary are seen, surfaced, known rapidly and helped in ways that might benefit many more personally than the current situation.

ARM boundaries—automated setting or updating (Paywalls, priorities, filters, protections, etc.): In some examples SPLS Boundary Management Services 4905 FIG. 115 and each of the managed SPLS boundaries (Paywall, Priorities, Filters, Protection) may be created, edited, deleted, replaced, etc. and some examples of said boundary management process are illustrated in FIG. 125, "Arm Boundaries: Automated Setting or Updating (Paywalls, Priorities, Filters, Protections, Etc.)". In some examples said boundary management process begins with the Paywall boundary 9854. In some examples said boundary management process begins with the Priorities/Filters boundaries 9855. In some examples said boundary management process begins with the Protection boundary 9856. In some examples said boundary management process begins with the SPLS Boundary Management Services as exemplified in FIG. 115 and elsewhere. In some examples no boundaries are set 9857 9858 and a person [or identity] may use one or a plurality of SPLS without a boundary(ies) 9858. In some examples no boundaries are set 9857 9858 and a person [or identity] may set one or more boundaries by automated means 9857 9860. In some examples no boundaries are set 9857 9858 and a person [or identity] may set one or more boundaries by manual means 9857 9859. In some examples one or a plurality of boundaries are set 9857 9858 and a person [or identity] may set and/or edit one or more boundaries by automated means 9857 9860. In some examples one or a plurality of boundaries are set 9857 9858 and a person [or identity] may set and/or at it one or more boundaries by manual means 9857 9859.

In some examples the automated setting, updating or editing of ARM SPLS Boundaries 9860 begins by being in an SPLS and selecting a Paywall boundary 9861. In some examples the automated setting, updating or editing of ARM SPLS Boundaries 9860 begins by being in an SPLS and selecting a Priorities/Filters boundary(ies) 9861. In some examples the automated setting, updating or editing of ARM SPLS Boundaries 9860 begins by being in an SPLS and selecting a Protection boundary 9861. In some examples the automated setting, updating or editing of ARM SPLS Boundaries 9860 begins by being in an SPLS and selecting a plurality of boundaries 9861. In some examples if said selected boundary(ies) 9861 is currently set and sufficient 9862 then results from said boundary(ies) 9861 may (optionally) be retrieved and its results reviewed 9863 from user records 9868. In some examples if results are sufficient 9863 9868 said selected boundary(ies) 9861 may be kept 9864; in which case another boundary might be edited 9865 and in some examples there is no more editing so editing may be ended 9866; however, if another boundary(ies) is to be edited 9865 then one or a plurality of boundary(ies) is selected 9861 and said process begins again. In some examples if results are not sufficient 9863 9868 said selected boundary(ies) 9861 may be edited or replaced 9864. In some examples boundary(ies) editing may be chosen 9864 to be done manually 9867 FIG. 128. In some examples boundary(ies) editing may be chosen and 9864 to be done with automation assistance 9870.

In some examples automation assistance begins by selecting one or a plurality of metrics 9870 as exemplified in FIG. 126 which illustrates the process for retrieving tracked boundary metrics 9884, and analyzing and displaying tracked boundary metrics 9890. In some examples tracked boundary metrics are retrieved 9884 in FIG. 126 by selecting one or a plurality of metrics 9885. In some examples Paywall metrics include revenue 9888, disturbance level 9888, interruption frequency 9888, by interest 9888 (in some examples "best for" . . . [business travelers, photographers, scientists, computer professionals, etc.]), etc. In some examples Priorities metrics include today's top news stories 9888 (with a number such as top 5, top 10, etc.), my top interests 9888 (with many of my categories of interests, some of my categories of interests, or only a few of my categories of interests), what's new and BIG 9888 (so I know what new and important), what's used most worldwide 9888 (so I know what people are doing the most based on what's tracked), what's funniest 9888 (so I know it today is newest and most popular humor), etc. in some examples Filters metrics include what I dislike most 9888 (with many of my dislikes, some of my dislikes, or only a few of my dislikes), specific sources I don't want 9888 (certain vendors, groups, individuals, politicians, etc.), what's least viewed or used worldwide 9888 (because I want to ignore what people are not doing), etc. In some examples Protection metrics include the streets near me that are most dangerous 9888, streets that are safest 9888 (fewest crimes), awareness of nearby risks (alerts and notices), nearby assistance available 9888 (monitoring, security services, etc.), what happiest near me 9888 (highest satisfaction, most popular, etc.), etc. In some examples said tracked boundary metrics 9870 9885 and "best boundaries" are retrieved from Boundary database(s) 9872 9886. In some examples said retrieved boundary metrics 9870 9885 and "best boundaries" may be (optionally) provided in some examples by one or a plurality of vendors 9873 9887, in some examples by one or a plurality of agents 9873 9887, in some examples by one or a plurality of services 9873 9887 (such as in some examples governances), in some examples by one or a plurality of affiliates 9873 9887, etc. In some examples said retrieved boundary metrics 9870 9885 and "best boundaries" may be (optionally) provided in some examples by one or a plurality of groups 9874 9889, in some examples by one or a plurality of governances 9874 9889, in some examples by one or a plurality of other third-parties 9874 9889, etc. In some examples said tracked boundary metrics 9870 may be (optionally) retrieved from another of said person's identities 9868 9869 in order to copy its Paywall boundary 9869, and/or copy its Priorities boundary 9869, and/or copy its Filters boundary 9869, and/or copy its Protection boundary 9869. In some examples said retrieved tracked boundary metrics 9870 9885 and "best boundaries" retrieved from Boundary database(s) 9872 9886 are analyzed and displayed 9890 by viewing the best boundaries for selected metrics. In some examples the best boundaries are determined by statistics as exemplified in a sample display of boundaries results 9897 that in some examples includes (1) the boundary name 9897 such as Paywall, (2) the metric name 9897 such as revenue, (3) the time. 9897 such as the last quarter, or such as the ability to edit the date range, and (4) a selector control 9897 such as the number of best boundaries to include such as "top 10," "top 5," etc.; with that sample display then illustrating a pictorial presentation of the best boundaries in some examples as a graph 9898, in some examples as a table 9898, in some examples as a comparative report 9898, in some examples as a list 9898, in some examples as annotated recommendations 9898, in some examples as popularity 9898 (frequency of use), in some examples as cost 9898 (if there are any costs), etc. In some examples the best boundaries are determined by ARM data mining/reporting 9893 as described in FIGS. 110, 111, and elsewhere. In some examples the best boundaries are determined by TP optimization 9895 as exemplified in the AKM (Active Knowledge Machine) as described in FIGS. 228 through 231, FIGS. 238 through 242, and elsewhere. In some examples the best boundaries are determined by other processes 9896 such as third-party analyses 9896, independent experts 9896, bloggers 9896, boundary services 9896, etc. In some examples of varied and numerous means for determining the best boundaries 9871 9891 9892 9893 9895 9896 9897 in some examples they utilize the same pictorial presentations 9897 9898 described elsewhere.

In some examples said retrieved boundary metrics and best boundary(ies) 9870 9872 9873 9874 9884 9885 9886 9887 9888 9889 are utilized to optimize said boundary(ies) settings (as described elsewhere such as in FIGS. 228 through 231 and FIGS. 238 through 242) and/or choose the best boundary(ies) for selected metrics 9871 9891. In some examples a person [or identity] may choose one or more retrieved example boundary(ies) for selected metrics 9871. In some examples said chosen retrieved boundary(ies) may be saved to said person's [or identity's] SPLS 9876. In some examples said saved chosen boundary(ies) 9876 may be manually edited 9877 9867 FIG. 128. In some examples said saved chosen boundary(ies) 9876 is not manually edited 9877 in which case it is applied and may be tried 9878, evaluated 9878, and reviewed 9878. In some examples it is liked and kept 9879. In some examples it needs to be changed 9878 and in some examples said person [or identity] returns to the boundary (ies) selection 9871. In some examples it needs to be changed 9878 and in some examples said person [or identity] returns to the metric(s) selection 9870. In some examples another boundary(ies) needs to be changed 9878 and in some examples said person [or identity] returns to the initial selection of SPLS boundary(ies) 9861 to add 9861 or edit 9861 SPLS boundary(ies). In some examples said automated setting, updating or editing of SPLS boundary(ies) 9860 is completed 9878 9879 9865 and said edited boundary(ies) are kept and said automated process is ended 9879 9866.

Figure 127:
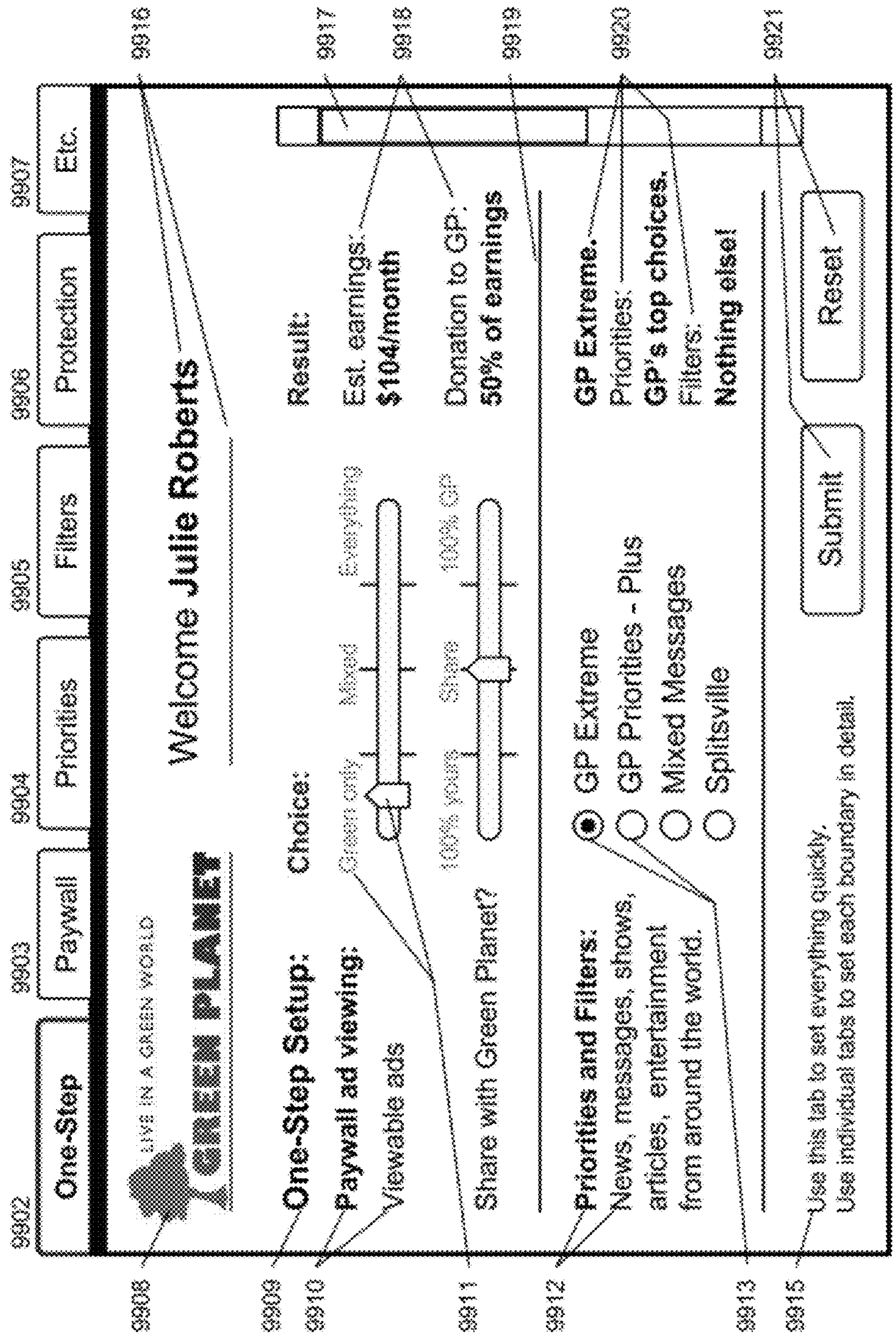
FIG. 127 is a pictorial diagram illustrating an example of setting ARM boundaries automatically (group example: "Green Planet" Environmental Governance).

ARM AUTOMATED BOUNDARIES EXAMPLE—GROUP EXAMPLE: In some instantiation examples of ARM automated boundaries setting, SPLS Boundary Management Services are illustrated in FIG. 127, "ARM Automated Boundaries Example: Group Example ("Green Planet" Environmental Governance)". In some examples said automated boundary selection and setting begins with one or a plurality of sources of said SPLS boundaries, in some examples 9873 9874 in FIGS. 125 and 9887 9889 in FIG. 126 said sources include Boundary database(s) 9872 9886, vendors 9873 9887, agents 9873 9887, services 9873 9887, affiliates 9873 9887, groups 9874 9889, governances 9874 9889, other third-parties 9874 9889, or from another of said person's identities 9868 9869. In some examples sources may be a governance as in FIG. 127 which illustrates the "Green Planet" (herein GP) governance 9908 (a fictional governance for illustration purposes) whose slogan is "Live in a Green World" 9908 which means when logged in to this governance's SPLS one's boundaries may be set 9902 9903 9904 9905 9906 9907 for an alternate reality that is much "greener" than the current reality. In some examples automated boundaries setting may require only a single screen 9902 and herein this single screen is labeled "One-Step" in a navigation tab 9902 and "One-Step Setup:" in a screen title 9909. in some examples it displays a logo 9908 and name 9908 of the boundary's source. In some examples it displays the name of the person [or identity] 9916 for whom the boundaries are being set. In some examples it displays navigation 9916 or means 9916 to change the identity(ies) for whom the boundaries are being set 9902. In some examples it associates the name of the identity(ies) 9916 for whom the boundaries are being set with means to change that identity(ies) 9916. In some examples it provides navigation such as tabs 9902 9903 9904 9905 9906 9907 or other means to interactively set all boundaries at once 9902 or edit each available boundary setting individually 9903 9904 9905 9906 9907; in some examples a Paywall boundary 9903; in some examples a Priorities boundary 9904; in some examples a Filters boundary 9905; in some examples a Protection boundary 9906; in some examples other types of boundaries for said SPLS alternate reality 9907.

In some examples the boundaries provider may orient and focus its SPLS boundaries on its core goals and mission such as in this Green Planet illustration. In some examples a boundary settings interface consists of controls. In some examples a boundary settings interface consists of tables. In some examples a boundary settings interface consists of graphical interface layouts. In some examples a boundary settings interface consists of recommendations and tips. In some examples a boundary settings interface consists of video and illustrations. In some examples a boundary settings interface consists of a combination of several different types of interfaces. In some examples the settings interface consists of three columns that in some examples include categories 9910 9912; in some examples include selectors 9911 9913; and in some examples include results of selections 9918 9920. In some examples the settings interface includes widgets 9917 to display additional settings not visible on the display screen; in some examples a scrollbar 9917; in some examples navigation; in some examples opening and closing interface zones; in some examples opening and closing sub-Windows; in some examples other graphical interface designs. In some examples the settings interface includes text guidance 9915, in some examples such as "Use this tab to set everything quickly. Use individual tabs to set each boundary in detail." 9915. In some examples the settings interface includes buttons 9921, in some examples to accept the current settings 9921 as in a "Submit" button 9921; in some examples to reset the settings to their previous values 9921 as in a "Reset" button 9921; in some examples to reset the settings to their default values 9921 as in a "Reset" button 9921.

In some examples the automated Paywall settings may be designed for one-step simplicity 9910; in some examples all Paywall advertising viewing 9910 permits one step selection of the types of viewable ads permitted through the Paywall 9910 9911 9918; in some examples by means of a category label 9910 such as "Viewable ads" 9910; in some examples by means of a selector 9911 that may include labels 9911 and a selection widget 9911, which in this case includes "Green only," "Mixed," and "Everything" wherein a slider control is currently set for "Green only;" in some examples the results 9918 of said selector may be displayed and this result would change dynamically based upon interactive changes made to the selector control 9911, which in this case includes "Estimated earnings: $104/month" 9918. In some examples such as this "Green Planet" cause-based governance, SPLS boundaries settings may include additional interactive controls; in some examples the option to contribute financial support to the organization that provides the boundaries; in some examples by means of a category label such as "Share with Green Planet?"; in some examples by means of a selector that may include labels and a selection widget, which in this case includes "100% yours," "Share," and "100% GP" wherein a slider control is currently set for "Share;" in some examples the results of said selector may be displayed, which in this case includes "Donation to GP: 50% of earnings", and this result would change dynamically based upon interactive changes made to the slider control. In some examples the automated Priorities boundary settings may be separate from the automated Filters settings. In some examples the automated Priorities boundary settings may be combined with the automated Filters settings for one-step simplicity 9912 9913 9920; in some examples one setting 9913 may choose both Priorities and Filters; in some examples by means of a category label 9912 such as "Priorities and Filters: News, messages, shows, articles, entertainment from around the world."; In some examples by means of a selector 9913 that may include labels 9913 in a "radio button" list 9913 which in this case includes "GP Extreme," "GP Priorities—Plus," "Mixed Messages," and "Splitsville"; in some examples the results 9920 of said selector may be displayed in this result would change dynamically based upon interactive changes made to the selector control 9913, which in this case includes "GP Extreme. Priorities: GP's top choices. Filters: Nothing else!"; in some examples an explanation may be provided for each selection choice, in some examples by pointing at each choice, which in this case includes "GP Extreme: Only the best Green World information and nothing else."/"GP Priorities—Plus: GP's top picks from news, articles, shows."/ "Mixed Messages: GP's top picks plus the big picture from a range of sources, opinions and entertainment."/"Splitsville: All views are included."

In some examples additional boundary settings are available by scrolling down the display 9917 to additional one-step boundary settings. In addition to SPLS boundaries disclosed elsewhere (such as Paywall, Priorities, Filters, Protection) additional boundaries may be added by each SPLS source; in some examples an environmental source may add an additional "Shopping" boundary, which in this case would provide direct connections within the SPLS to "green" products, services, vendors, etc.; in some examples and environmental source may add an additional "How to Live" boundary, which in this case would provide direct access within the SPLS to "green" guidance in areas such as transportation, home energy use, home office/telecommuting, etc.

Figure 128:
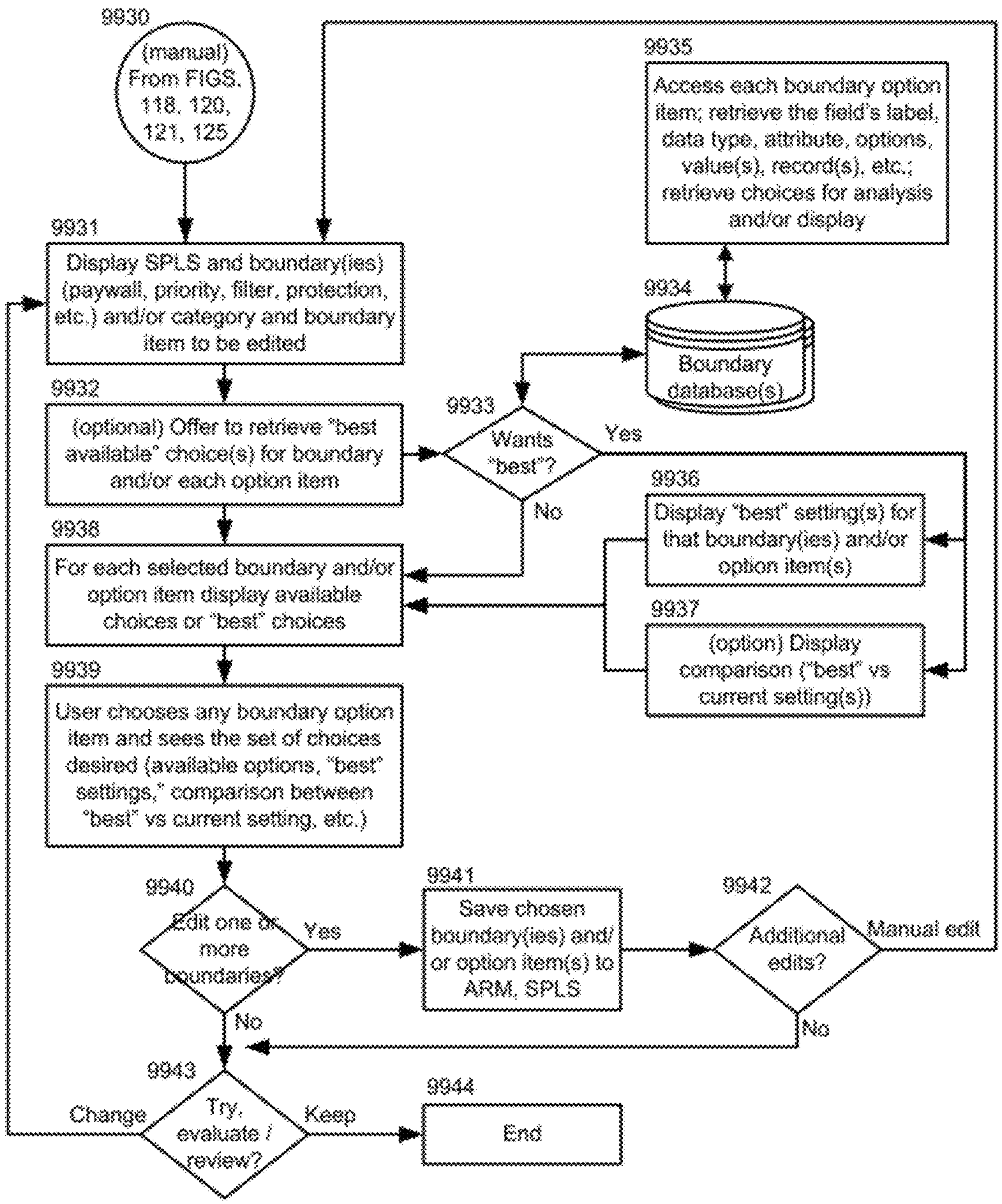
FIG. 128 is a flow chart showing some examples of procedures for manual setting, updating or editing of boundaries, including retrieving and applying "best available" choices including in some examples paywalls, priorities, filters, protections, etc.
Figure 129:
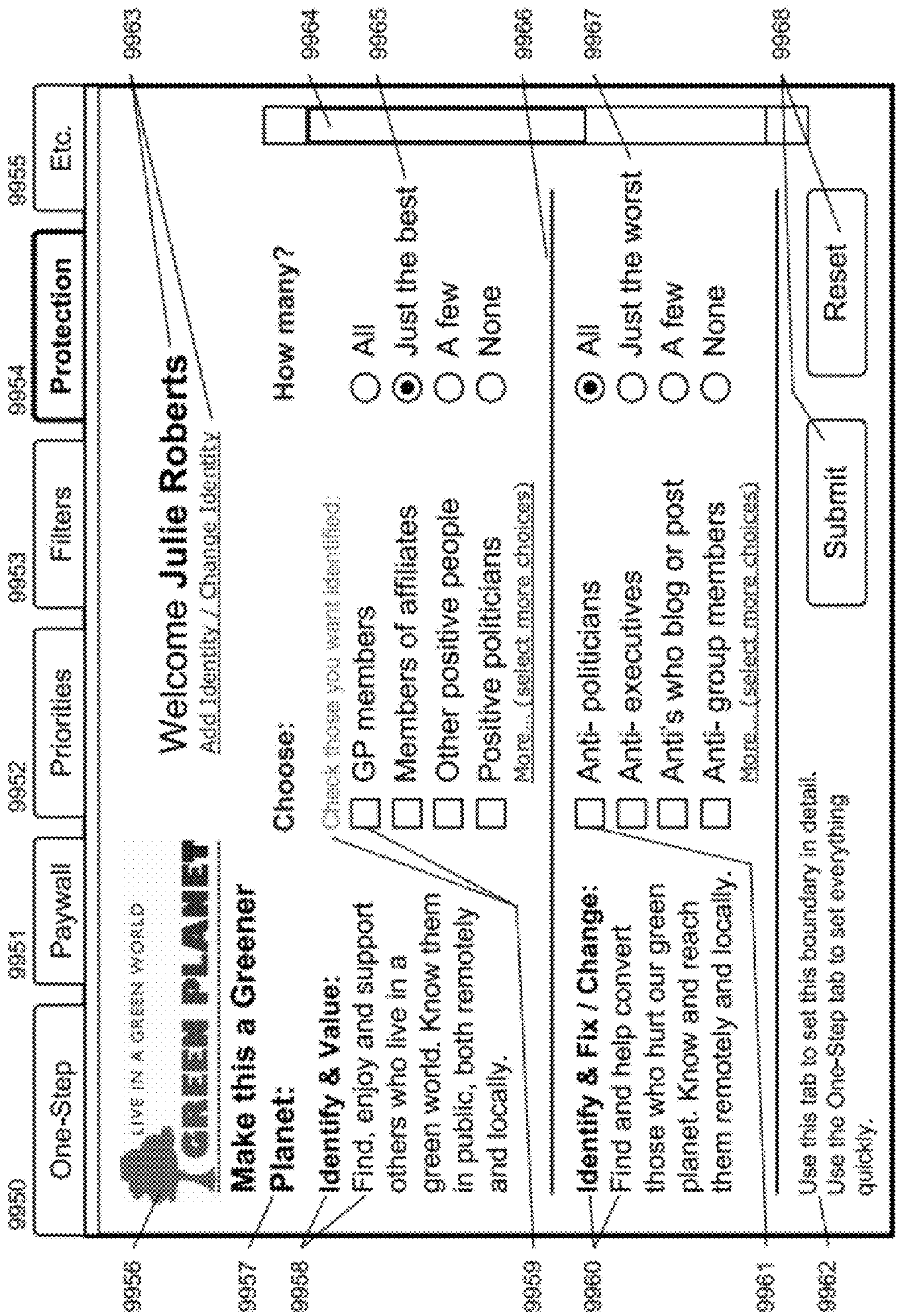
FIG. 129 is a pictorial diagram illustrating an example of setting ARM boundaries manually (group example: "Green Planet" Environmental Governance).

ARM BOUNDARIES—MANUAL SETTING OR EDITING (PAYWALLS, PRIORITIES, FILTERS, PROTECTIONS, ETC.: In some examples a person [or identity] may edit one or more boundaries by manual means as illustrated in boundary management 9857 9859 FIG. 125 and elsewhere. Some examples of said manual boundaries setting are illustrated in FIG. 128, "ARM Boundaries: Manual Setting or Editing (Paywalls, Priorities, Filters, Protections, Etc.)." In some examples this begins 9930 by displaying an SPLS and one or a plurality of its boundaries 9931; in some examples a Paywall boundary 9931; in some examples a Priorities boundary 9931; in some examples a Filters boundary 9931; in some examples a Protections boundary 9931; in some examples other boundaries 9931, which in FIGS. 127 and 129 are exemplified by a "Shopping" boundary and a "How to Live" boundary. In some examples this begins 9930 by displaying an SPLS boundary category 9931 and a boundary item 9931 to be edited.

In some examples a choice(s) is available to retrieve the best available choices 9932 such as the "best boundary" 9932. In some examples a choice(s) is available to retrieve the best available choices for a boundary category 9932. In some examples a choice(s) is available to retrieve the best available choices for a boundary option item 9932. In some examples the best available choice is wanted 9933. In some examples the best available choice(s) is wanted 9933 and that is retrieved by numerous and varied means as described elsewhere. In some examples the best available choice(s) is wanted 9933 and after retrieval the "best boundary(ies)" 9936 is displayed. In some examples the best available choice(s) is wanted 9933 and after retrieval the "best setting(s)" 9936 for a boundary category is displayed. In some examples the best available choice(s) is wanted 9933 and after retrieval the "best setting(s)" 9936 for a boundary option item is displayed. In some examples the best available choice(s) is wanted 9933 and retrieved 9936 and its display includes a comparison 9937 between the "best" and the current boundary; in some examples its display includes a comparison 9937 between the "best" and the current boundary category; in some examples its display includes a comparison 9937 between the "best" and the current boundary option item. In some examples only the current options are desired 9932 and the choice is not taken to retrieve the "best" 9933; which in some examples retrieves each boundary selected for editing 9931 9934 9935; in some examples retrieves each boundary category selected for editing 9931 9934 9935; in some examples retrieves each boundary option item selected for editing 9931 9934 9935. In some examples, for each choice(s) displayed 9939 user sees the set of choices desired; in some examples the display includes the "best" setting(s) 9939; in some examples the display includes a comparison(s) between the "best" versus current setting(s) 9939; in some examples the display includes the available options 9939. In some examples the user makes choices and edits said boundary 9940. In some examples the user makes choices and edits said boundary category 9940. In some examples the user makes choices and edits said boundary option item 9940. In some examples after one or a plurality of edits have been made 9940 said edited boundary(ies) are saved 9941 to its SPLS. In some examples after one or a plurality of edits have been made 9940 said edited boundary category(ies) are saved 9941 to its SPLS. In some examples after one or a plurality of edits have been made 9940 said edited boundary option item(s) are saved 9941 to its SPLS. In some examples additional manual edits are desired 9942, in which case said manual boundary editing process is continued 9931.

In some examples said saved edits are saved 9941 and further edits are not needed 9942 in which case said saved edits 9940 are applied and may be tried 9943, evaluated 9943, and/or reviewed 9943. In some examples said boundary edit (s) is liked and kept 9944. In some examples said boundary edit(s) needs to be changed 9943 and in some examples said person [or identity] returns to the boundary(ies) selection 9931 in which case said manual boundary editing process is continued 9931. In some examples said manual boundary setting, updating or editing 9943 is completed 9944 and said edited boundary(ies) are kept and said manual boundary setting process ends 9944.

ARM manual boundaries example—group "project" example: In some instantiation examples of ARM manual boundaries setting, SPLS Boundary Management Services are illustrated in FIG. 129, "ARM Manual Boundaries Example: Group "Project" Example ("Green Planet" Governance)". In some examples said manual boundary selection and setting begins with one or a plurality of sources of said SPLS boundaries as described elsewhere. In some examples sources may be a governance as in FIG. 127 and now in FIG. 129 which illustrates the "Green Planet" (herein GP) governance 9956 previously described. In some examples manually setting and/or editing an individual boundary may require multiple display screens, Windows, zones that open and close, etc. In some examples manually setting and/or editing an individual boundary may require one display screen for that boundary, which is exemplified by the Protection boundary 9954 which has some examples in this figure. As described elsewhere in some examples it displays a logo 9950 and name 9956 of the boundary's source; in some examples it displays the name of the person [or identity] 9963 for whom the boundaries are being set; in some examples it displays navigation such as tabs 9950 9951 9952 9953 9954 9955 or other navigation means; in some examples it displays an option to interactively set all boundaries at once 9950; in some examples it may utilize various controls 9958 9959 9965 9960 9961 9967 9968 9964 9963 of varying designs, types and styles; in some examples it may utilize various layouts and designs; in some examples it may provide various types of guidance 9957 9958 9962. In some examples the manual boundary settings may be designed for individual boundary option item setting, editing or choosing 9958 9959 9965; in some examples by means of an item label 9958, which in this case includes "Identify and Value: Find, enjoy and support others who live in a green world. Know them in public, both remotely and locally."; in some examples by means of a selector 9959 that may include labels 9959, which in this case includes an instruction 9959 "Check those you want identified:" and selection items 9959 "GP members," "Members of affiliates," "Other positive people," "Positive politicians," and "More . . . (select more choices)"; in some examples by means of an additional selector 9965, which in this case permits selection of the number wanted 9965 such as "All," "Just the best," "A few," and "None". In some examples a plurality of manual boundary settings may be included for individual boundary option item setting, editing or choosing 9960 9961 9967; in some examples by means of an item label 9960, which in this case includes "Identify and Fix/Change: Find and help convert those who hurt our Green planet. Know and reach them remotely and locally"; in some examples by means of a selector 9961 that may include labels 9961, which in this case includes selection items 9961 "Anti-politicians," "Anti-executives," "Anti's who blog or post," "Anti-group members," and "More . . . (select more choices)"; in some examples by means of an additional selector 9967, which in this case permits selection of the number wanted 9967 such as "All," "Just the best," "A few," and "None"; in some examples and explanation may be provided for selection choices, which in this case may include descriptions such as anti-environmental individuals, members of anti-environmental groups, those who actively post anti-environmental messages or comments, anti-environmental politicians, etc.

In some examples additional boundary settings are available by scrolling down the display 9964 to additional manual boundary settings. In some examples the Protection boundary includes personal safety that is based on real crime statistics rather than fears created by the daily television news and printed news (which expand their audiences but have been scientifically shown to not reflect the real facts about the volume of crime and personal safety). In some examples boundary option items may include the ability to set alerts for known high-risk individuals currently near your location; in some examples high-risk locations that are near you so you can avoid them; in some examples violent crimes when they occur near you so you can avoid them (assault, robbery, rape, murder, etc.); in some examples property crimes when they occur near you so you can avoid them (business thefts, home burglaries, motor vehicle thefts, arson, etc.); in some examples vandalisms when they occur near you so you can avoid them (homes, businesses, religious institutions, public spaces, etc.). In some examples the boundary provider may orient and focus its SPLS boundaries on its core goals and mission such as in this Green Planet illustration; in some examples a cause group's boundary may have options to "Approach and Involve" with a control such as a slider or radio buttons to set the level of identification and action, which in this case if someone is identified as positive the GP member could be alerted to suggest joining GP, or in this case if someone is identified as negative the GP member could be alerted to consider changing one practice that will help the environment, or in this case automated means can be provided to add anyone to GP's automated environmental communications. In some examples a cause group's boundary may have options to "Take Public/Political Action" with a control such as a slider or radio buttons to set their level of action, which in this case can be activity levels such as once a day, twice a week, three times a month, four times a year, or never, and in this case GP's political action operations could then utilize its membership to help communicate the need for specific improvements based on their frequency and willingness to take action. In some examples when the boundary settings or edits are complete they may be accepted 9968 by means such as a "Submit" button 9968; in some cases the settings may be reset to their previous values 9968 by means such as a "Reset" button 9968; in some cases the settings may be reset to their default values 9968 by means such as a "Reset" button 9968.

In some examples additional types of individual boundaries may be available by navigating to those settings 9955 such as when there is a separate tab, menu choice, link, navigation button, or navigation control for each boundary. In some examples a separate "Shopping" boundary would provide direct shopping connections, in this example by means of this GP SPLS with environmentally positive products, services, vendors etc.; in some examples these would connect the identity to product vendors, which in this case could be (fictional) examples such as GP Amazon, GP Best Buy, GP Macy's, GP Gap, etc.; in some examples these would connect the identity to a healthier agribusiness, which in this case could be (fictional) examples such as GP Winn Dixie, GP Albertsons, GP Publix, GP Piggly Wiggly, etc.; in some examples these would connect the identity to an online eco-store, which in this case could be the (fictional) example of the GP Eco-Store which would carry a selection of environmental products and services; in some examples these would connect the identity to an online eco-store, which in this case could be the (fictional) example of the GP World Store which would carry a selection of products that are made organically and from natural materials by native peoples around the world. In some examples a separate "How to Live" boundary would provide direct connections by means of a SPLS with numerous ways to make environmentally positive personal changes, including monitoring one's behaviors (when technically possible) and reporting the results of one's lifestyle choices; in this GP example these would assist with changing one's transportation, which in this case would be green cars, bicycles, public transportation, etc.; in some examples these would assist with changing one's home energy use, which in this case would be lighting, laundry, hot water, air conditioning/heating, entertainment, computing, etc.; in some examples these would assist with changing one's home office/telecommuting, which in this case would be a green home office, green networking, telecommuting part-time, job sharing, etc. In some examples other separate SPLS boundaries would provide other means to define one's chosen alternate reality(ies).

ARM PHYSICAL PROPERTY PROTECTION BOUNDARY (LOCATIONS, PROPERTY, DEVICES): Some examples in FIG. 130, "TP Protection Services: Property (Locations, Property, Devices)" illustrate the Protection of devices, which illustrates this Alternate Reality's approach to providing an additional layer of physical property protection by means of the TP Protection Boundary Services described elsewhere. In some examples a Property Protection boundary differs from an Individual's Protection boundary (as described elsewhere), a Group's Protection boundary (as described elsewhere), and the Public's Protection boundary (as described elsewhere) by providing an increased opportunity to secure and protect those interactive items desired by each person [or identity]. In some examples protected property may be a residence. In some examples protected property may be an automobile. In some examples protected property may be a computing device, such as a PC, laptop, Netbook, tablet, pad, etc. In some examples protected property may be a mobile phone. In some examples protected property may be any electronic device that can interact such as some digital cameras. In some examples a third-party service organization may provide these property protection service(s) for one or a plurality of a person's property(ies). Therefore in some examples the TP's Protection boundary may serve to provide safer and more secure Shared Planetary Life Spaces that include physical property. In some examples this additional property protection reflects the choices of each person [or identity] with some SPLS's having considerably greater protection than others, based on those separate and independent choices.

In some examples the TP Property Protection boundary begins when a person [or identity] attaches an interactive device 9972 an identity's user profile 9970 9986. In some examples the TP Property Protection boundary begins when a person [or identity] attaches an interactive device 9972 to a plurality of identities' user profiles 9970 9986. In some examples an electronic device is "tethered" 9987 to a vendor by means of a license 9987. In some examples an electronic device is "tethered" 9987 to a vendor by means of a rental 9987. In some examples an electronic device is "tethered" 9987 to a vendor by means of a service contract 9987 (such as a mobile phone). In some examples said interactive device 9972 must be set for a "use" interaction 9972; in some examples a use interaction includes every use of the device 9972; in some examples a use interaction includes only uses when said identity(ies) is not present 9972; in some examples a use interaction includes when said identity(ies) has left 9972. In some examples said identity(ies)' user profile 9972 must be set for a "use" interaction 9972 for that attached device 9972; in some examples a use interaction includes every use of the device 9972; in some examples a use interaction includes only uses when said identity(ies) is not present 9972; in some examples a use interaction includes when said identity(ies) has left 9972. In some examples the TP Property Protection Boundary is set for "not present" automation 9973, and in this example the TP Presence Service 9974 is used to monitor presence. In some examples the device simply monitors its protection settings 9975; in some examples its protection is on all the time 9975; in some examples its protection monitoring is activated only when the device is turned on 9975; in some examples its protection monitoring is activated only when a person [or identity] is not present 9975. In some examples the device is inactive 9976. In some examples the device is not set for monitoring 9976. In some examples a monitoring service may monitor a plurality of devices 9976 for a use interaction 9972. In some examples when a "Use Interaction" starts 9977 the interactive device interacts with the current user 9977 for authentication. In some examples when a "Use Interaction" starts 9977 the interactive device expects to receive authentication information 9977 such as a house security system code, a mobile phone password, etc. In some examples said authentication information 9977 is confirmed by the TP Authentication and Authorization Service 9978 which also communicates with the appropriate TP User Profile(s) 9986 to confirm device authorization 9978. In some examples a camera, fingerprint reader or other biometric recognition device may be a component of the interactive device 9970 so the (if needed and optional) TP Biometric Recognition Services 9979 may be applied.

In some examples the device is authorized 9978 9980 in which case use is permitted 9981. In some examples (optional) monitoring of use continues 9982. In some examples of continued use monitoring 9982 after a predefined period of non-use the device may be timed out and re-set to "inactive" 9982 9976. In some examples the device is not authorized 9980 in which case property protection begins 9983. In some examples each instance of unauthorized use 9980 is recorded in a Protection database as described elsewhere in the TP protection service. In some examples each instance of unauthorized use 9980 includes means to send an alert(s) 9983 and to escalate set alerts at each subsequent unauthorized use 9977 9978 9980; in some examples, a first alert from an unauthorized use could notify you 9983; in some examples, a first alert from an unauthorized use could also notify others on an "alert list" 9983; a second alert could notify a security (escalation) service 9983; a third alert could request security assistance 9983; a fourth alert could notify police and request police assistance 9983; etc. In some examples each instance of unauthorized use 9980 includes means to take action 9984 and to escalate said actions at each subsequent unauthorized use 9977 9978 9980; in some examples, a first physical action is to have said interactive device make a loud continuous noise 9984 which may resemble a security alarm; a second physical action is to notify the user that a security service has been notified 9984; a third physical action is to display to the unauthorized user repeated notifications that device theft messages are being continuously sent 9984; a fourth physical action is to repeatedly make the loud continuous noise at each use 9984 as a continuing alarm, accompanied by repeated messages to the unauthorized user that the device will be disabled if unauthorized use continues 9984. In some examples (optional and if technically available) after a pre-set number of unauthorized uses 9977 9978 9980 a remote "kill" of device may be performed 9985; in some examples device use may be completely terminated 9985; in some examples only certain functions of said device may be disabled 9985; in some examples with a "tethered" device 9987 the vendor of said "tethered" device may be notified to turn off the device 9987, similar to a mobile phone service vendor shutting down a mobile phone's service when it is stolen.

TELEPORTAL UTILITY (TPU)—A UTILITY FOR MULTIPLE NETWORKS, DEVICES, APPLICATIONS AND SERVICES—SUMMARY: A new combination of new devices, configurations and networks provides a new opportunity to turn separate functions into a new type of utility whose functions may be provided simultaneously to a plurality of individuals, groups, networks, devices, applications, etc., enhancing their design, development, sale, provisioning and use. Rather than needing to learn each different software and device interface(s), and rather than needing to log into a plurality of separate devices, applications, products, services, networks, etc. that operate as silos, do not communicate with each other, require separate learning curves, and therefore do not share advantages of speed or scale—a new type of utility might be used to provide "as if you were there" connectivity in "shared planetary life spaces" with a consistent user interface and expectations by means of multiple devices, applications, networks, etc.

Figure 131:
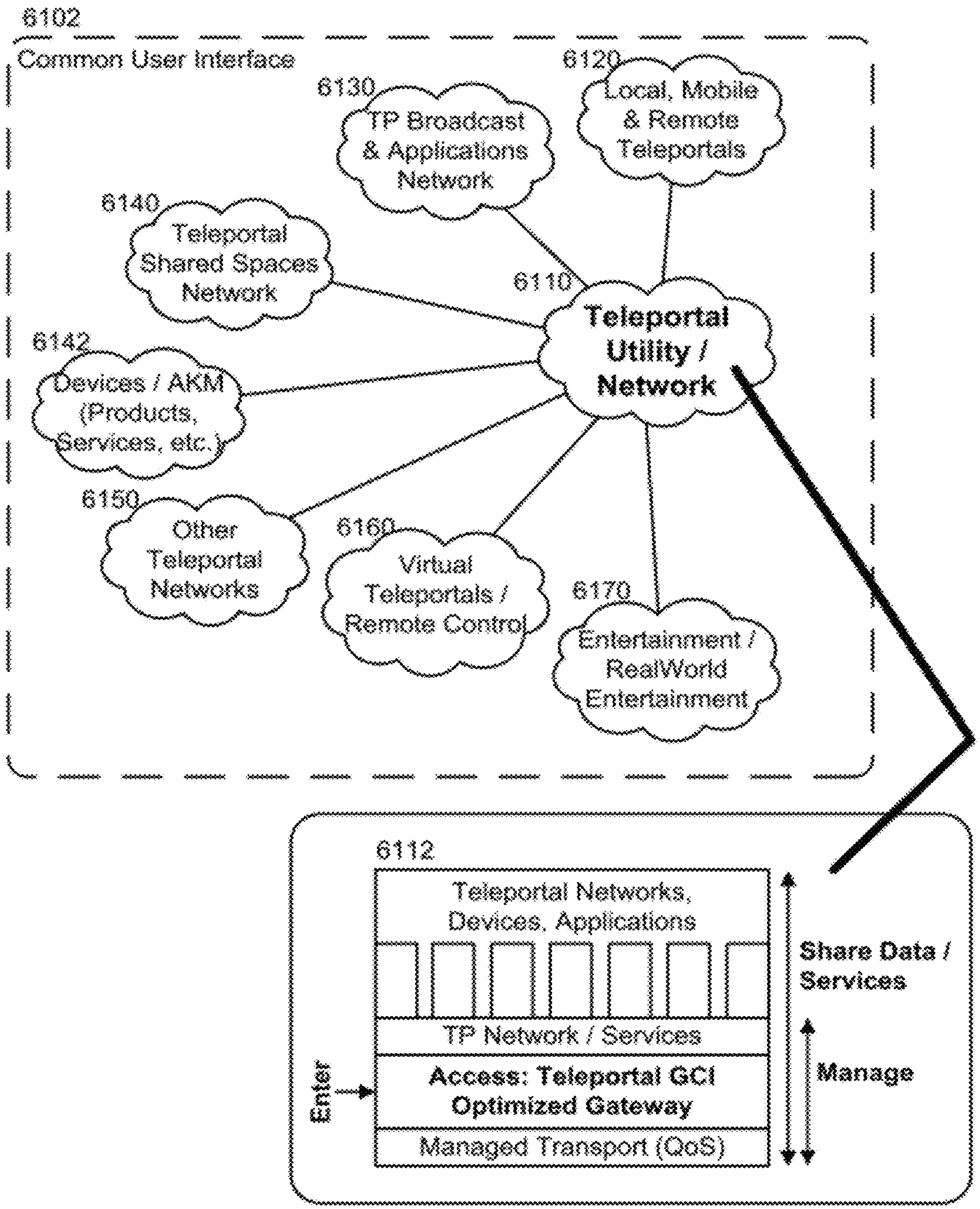

Turning now to FIG. 131 one component includes a set of services and systems 6110 6112 that can support multiple networks 6120 6130 6140 6150 6152, and also different types of networks. This includes a Teleportal Networks Platform 6110 6160, as well as networks that may utilize this platform. These networks include a Teleportal Network 6120, a Teleportal Shared Space Network 6140 and a Teleportal Broadcast and Applications Network 6130. Similarly, other types of Teleportal Networks can also utilize the Teleportal Networks Platform 6110, including: E-commerce Teleportal Networks 6152, Social Teleportal Networks 6152, Business Teleportal Networks 6152, Sports Teleportal Networks 6152, Travel Teleportal Networks 6152, News Teleportal Networks 6152, Technology Teleportal Networks 6152, Entertainment Teleportal Networks 6152, Education Teleportal Networks 6152, Environmental Teleportal Networks 6152, Government Teleportal Networks 6152, Alerts & Events Teleportal Networks 6152, Violent Crimes Teleportal Networks 6152, Other Types of Teleportal Networks 6152.

Any type of Teleportal Network, application or service 6102 6150 6152 may have multiple providers (including both corporations and individuals), and each may design and deliver multiple unique or customized products or services across its network, each of these having varying capabilities and features. There is no requirement that each of these Teleportal Networks 6102 6120 6130 6140 6150 6160 6170 6142 or Teleportal Devices 6120 utilize any specific or all aspects of the Teleportal Networks Platform 6110. Instead, each type of Teleportal Network, vendor, product and/or service may utilize any set or sub-set of capabilities and features of said Teleportal Utility and/or Teleportal Network 6110 6112, and may simultaneously utilize independent capabilities and features that are either selected from any available device(s), tool(s) or service(s), custom built by its provider, purchased from third parties, and/or developed as open source and used for free.

Figure 132:
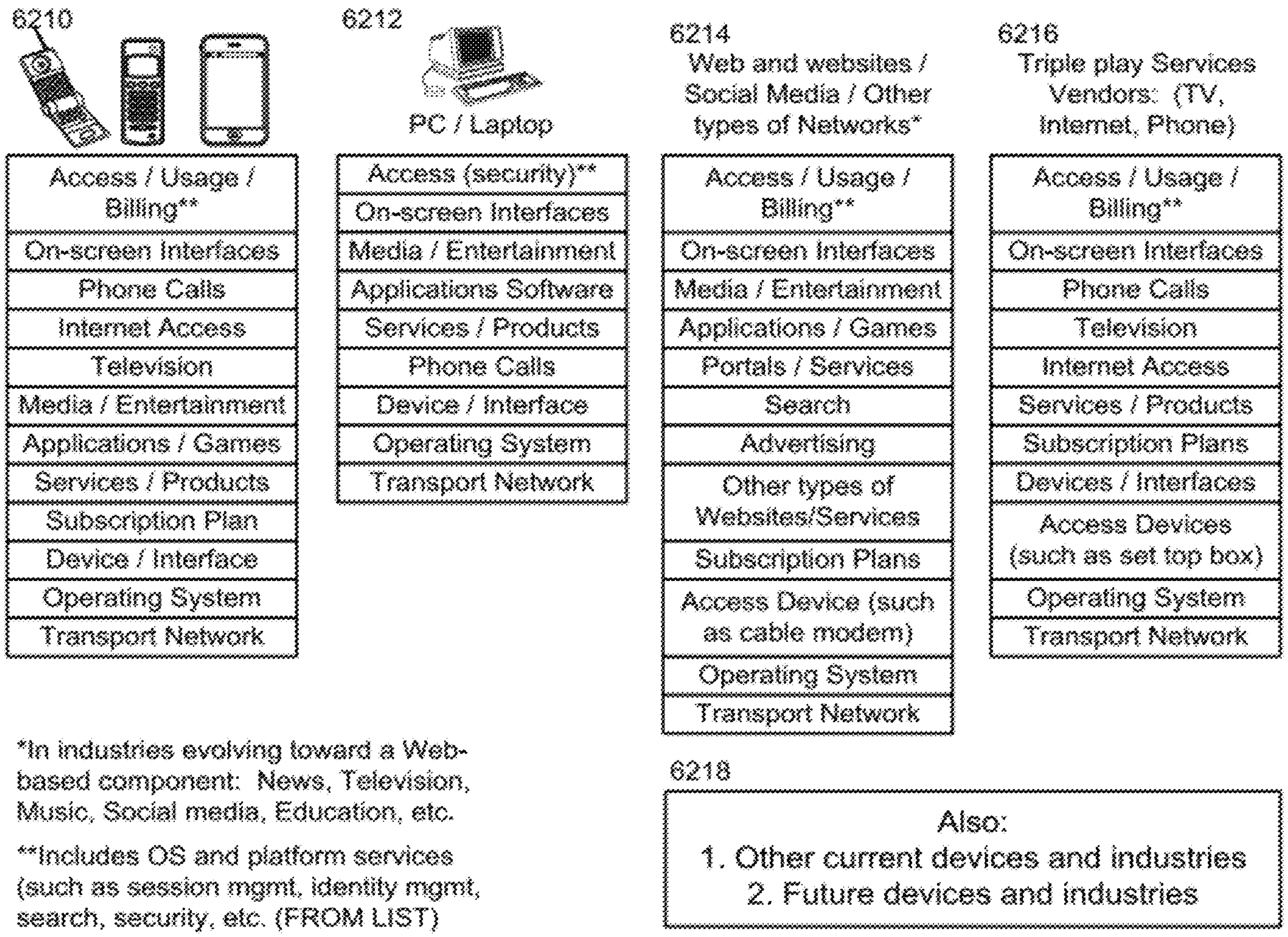

As illustrated in FIG. 132 the Teleportal Utility (TPU) factors redundant and (if redesigned) reusable common elements in a plurality of global technologies. While this FIG. 132 lists four such technologies, these disclosed technologies have parallels in a wide range of other global technologies 6218 to accomplish the desired "TPU" results as disclosed herein. This has as one of its objectives to converge new yet uncombined technological capabilities into a user friendly and natural system known herein as a "Teleportal Utility (TPU)".

Four of the various example technologies are referenced herein and include: Mobile phones 6210; Personal computers and laptops 6212; The commercial and personal Internet (the world wide web, commercial websites, social networks, other types of specialized networks, etc.) 6214; "Triple play" services that include telephone, high-bandwidth internet access and television (from cable television vendors, telephone vendors, mobile phone vendors, ISPs [internet service providers], etc.} 6216.

Figure 133:
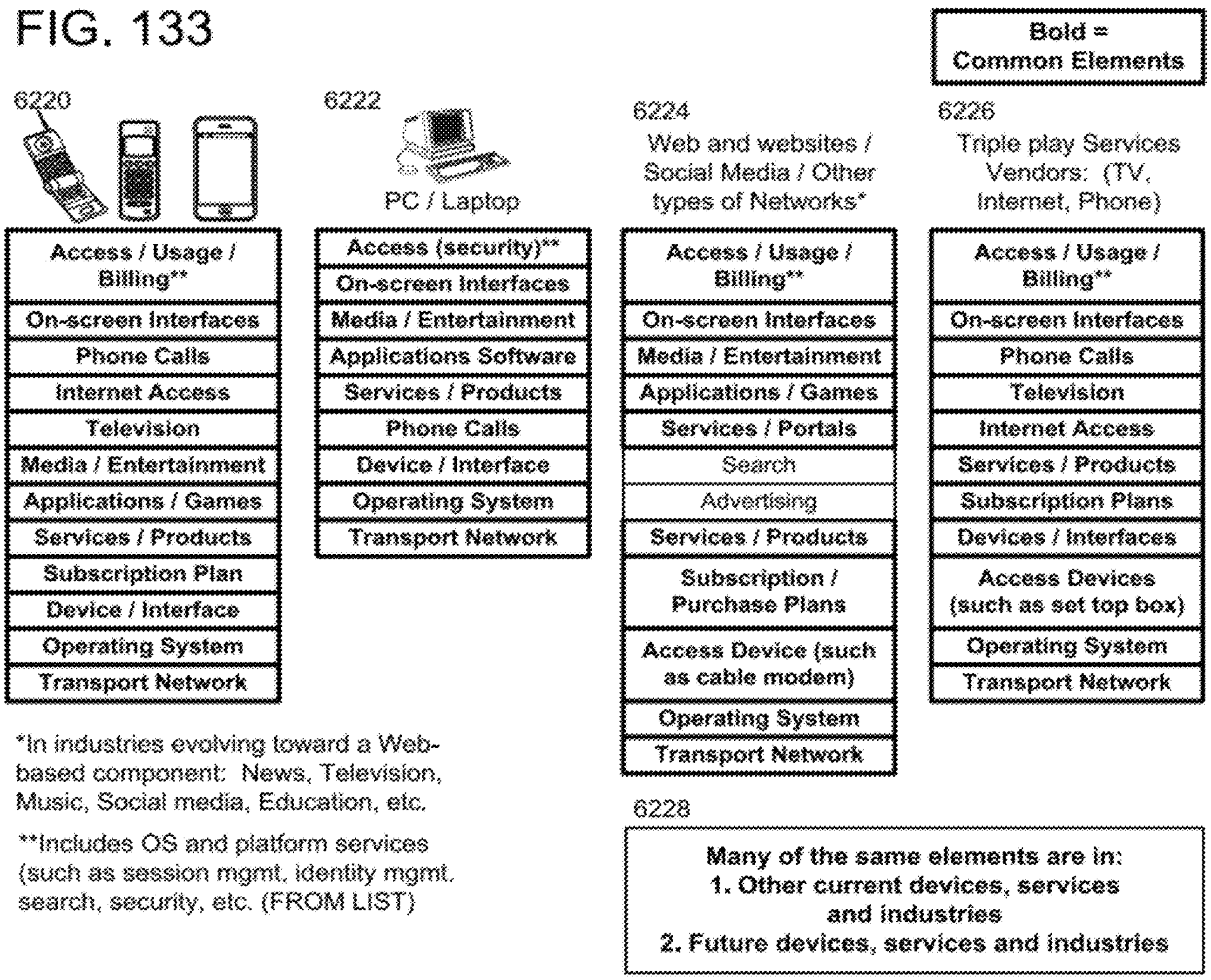

Turning now to FIG. 133, the common features of these technologies 6220 6222 6224 6226 is highlighted in gray. These features have parallels in a wide range of other global technologies 6228. This has as one of its objectives to converge a plurality of these uncombined technological capabilities into a user friendly system known herein as a "Teleportal Utility (TPU)". Starting from the bottom and moving upward, these common features include: Transport network: In these technologies. Operating system: In these technologies. A device interface (hardware UI): In two of the technologies (mobile phone, PCs/laptops). An access device that is not usually configured by the end-user: In two of the technologies (the Internet has a device such as a cable modem and/or a router, and a "triple play" network has similar access such as a cable TV set-top box). Subscription plan: In one or a plurality of technology-based platforms (in some examples mobile phone, web, specialized online networks, "triple play" services, etc.). Services/products are available for purchase: In these four technologies. Some of these services and products include: Mobile phones 6220: Applications, games, media, entertainment, mobile television, Internet access, phone calls, etc. PCs/Laptops 6222: Applications, games, entertainment, phone calls. Web, websites, social networks, other types of networks 6224: Applications, games, media, entertainment, numerous types of specialized networks, products and services, etc. Triple play services vendors (TV, Internet, phone) 6226: Applications, games, media, entertainment, television, Internet access, phone calls, numerous types of specialized networks, products and services, etc. On-screen interfaces: In these four technologies. Metered access, usage and billing as appropriate: In three of our technologies (mobile phones, going online (unless an "all you can eat" subscription is bought), the use of a plurality of online websites and services (even if free use is monitored to learn about users and needs, charge for advertising, etc.), and "triple play" services.

Currently in a plurality of global technologies, each type of device is provisioned and managed by means of discrete sets of functionally duplicative services as illustrated in FIG. 133 mobile telephones 6220, PCs/laptops 6222, the world wide web and specialized networks 6224, and triple play services 6226.

Figure 134:
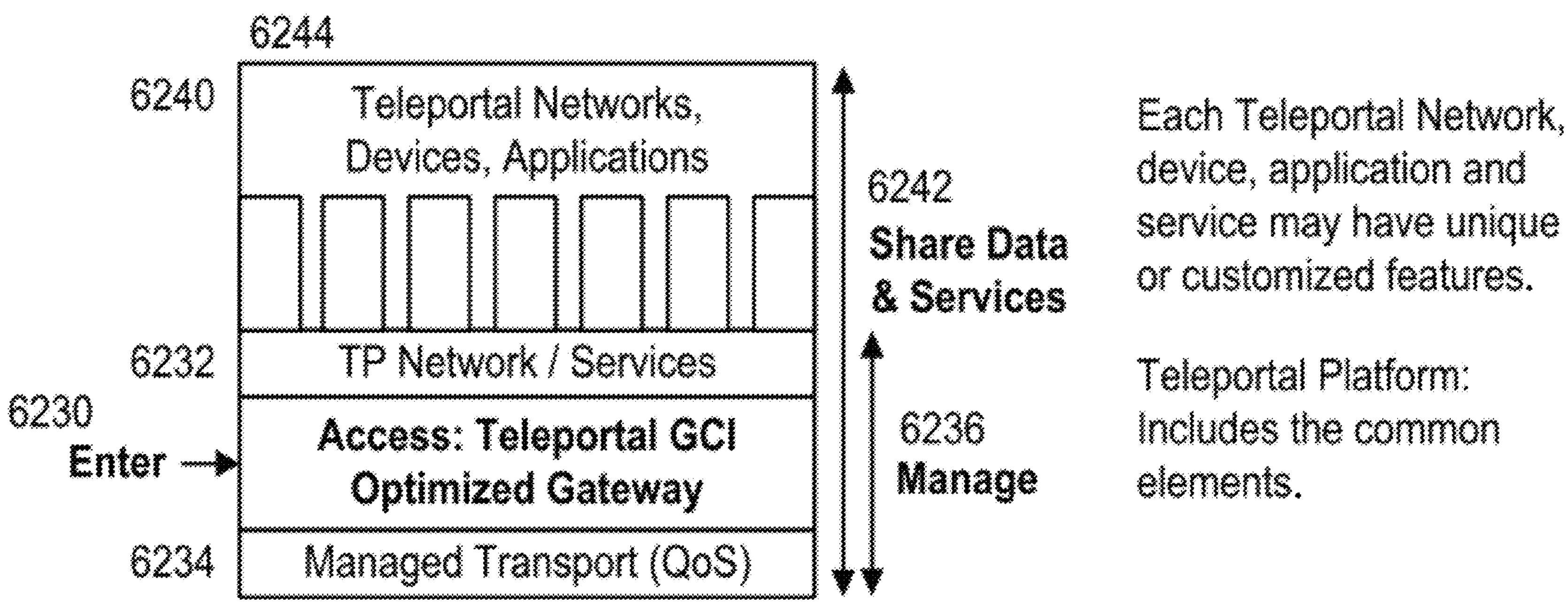

Instead, as shown in FIG. 134 a Teleportal Utility (TPU) factors down the common elements in said global technologies to more basic levels, to provide end-to-end services that can support the design, development and operation of a plurality of types of networks and devices that may operate on said TPU such as: Users and devices enter and access the TPU 6244 by means of a Platform Optimized Gateway 6230 (POG). Said POG 6230 establishes and provisions an appropriate session for that user and device by means of Teleportal Network/Services 6232. Provisioning may optionally include establishing differential levels of service and managing 6236 said services and optimizing the transport of various levels of sessions, or of selected sessions, across (the parts of) the network (where that is possible) by means of Managed Transport 6234. Said sessions may be from the Teleportal Network 6120 in FIG. 131, the Teleportal Shared Space Network 6140, the Teleportal Broadcast and Applications Network 6130, and/or Other Teleportal Networks, Devices, Applications or Services 6232 6240. The associated event data from said sessions is shared 6242 between the TPU 6230 6232 6234 6236 and other Teleportal Networks, Devices, Applications or Services 6232 6240.

Together, these provide a high-level summary of the Teleportal Utility (TPU) 6244, which is now described in greater detail.

A utility for multiple networks, devices, applications and services: The simplified diagram in FIG. 134 contains examples of functionality shown in FIG. 135 which provides a more detailed description of the Teleportal Utility (TPU) that is described in greater detail: CUSTOMERS (light blue in FIG. 135): The major stages in the customer lifecycle are listed 6456, including finding, buying, receiving, configuring, using, servicing and upgrading. Some of the major customer market segments are listed 6440 including corporate/government 6442, consumer/home 6444, mobile communications 6446, non-profit/education 6448 and other 6450. As part of the TPU 6400, customers and their devices 6402 are at the highest level. VENDORS, PARTNERS, AFFILIATES, ETC. (light green in FIG. 135; vendors, partners, affiliates, etc. are herein referred to as "vendors"): Similarly for vendors, the major stages in the vendor lifecycle are listed 6450, including building, deploying/manufacturing, selling, use by customers, servicing and upgrading. By utilizing the TPU 6400, vendors are able to deliver a variety of Teleportal Networks, devices, applications and services 6404. These may include vendor systems 6406, such as an OSS (an Operations Support System, a vendor's methods, procedures and systems that support its operations), and a BSS (a Business Support System, back end business systems such as account receivables, billing, customer care and data warehousing). THE TELEPORTAL UTILITY (TPU; gray in FIG. 135) 6400 comprises the remaining areas in this figure. The TP's layers plus platform-wide services resemble the historic OSI (Open Systems Interconnect) seven-layer model for computer network architecture and protocol design. Similar to the traditional OSI Model each TP layer is a conceptually similar group of functions that may generally receive services from layers below it and provide services to layers above it. In the TP 6400, starting at the bottom these layers include: Platform-wide services 6430; Managed transport (QOS) 6428; Platform operating system 6426; Servers/storage/load balancing 6424; Virtualization 6422; Teleportal Utility (TPU) optimized gateway (herein TPOG) 6420. Teleportal network services 6418; Teleportal device management (RTP's, LTP's, MTP's, AIDs./AOD's) 6416; Teleportal Utility business systems 6414; Applications and services 6412; Presentations/user experience/user interfaces 6410; Partners/supply chain/services ecosystems 6408.

In addition, in some examples platform-wide services 6430 such as messaging, are employed such as for sharing data and services throughout the Teleportal Utility (TPU) 6434. Said data sharing in some examples is utilized for functions such as Management 6432 by various parts of the TPU.

Figure 136:
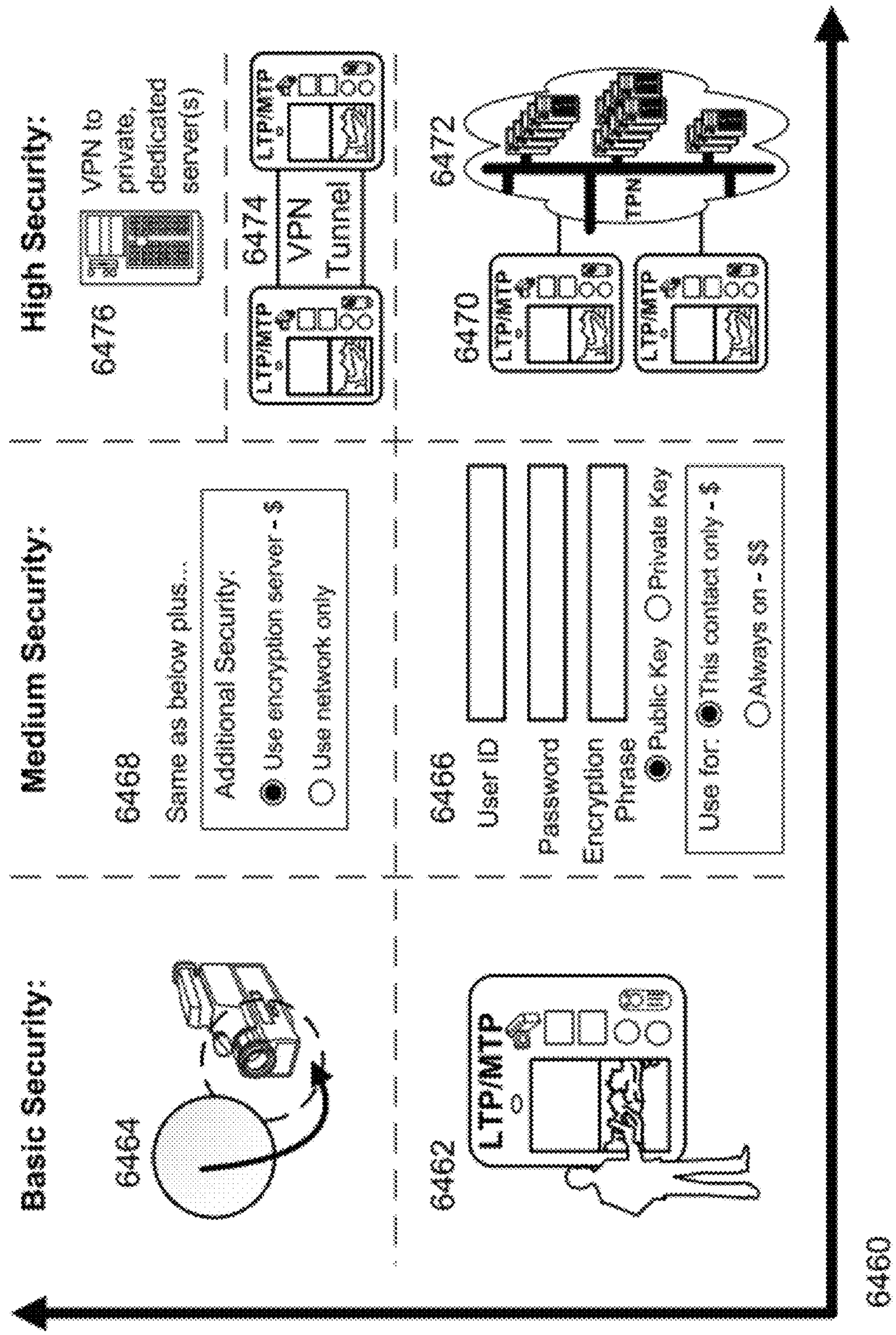

Utility services 6430 (in some examples security, data sharing, messaging, etc.): In some examples various services may be shared across the Teleportal Utility (TPU) 6400 in FIG. 135. While not a complete list of these services, three of some examples include security, data sharing and messaging:

Security (Utility service 6430): As shown in FIG. 136, in some examples the range of TP communications security and privacy options are illustrated in a Security/Privacy model that ranges from basic security to medium security to high security. These levels may also reflect potentially different cost levels for customers.

The X axis 6460 shows the TP's three security and privacy levels ranging from in some examples basic on the left, medium in the middle, and high security and privacy on the right. Similarly, the Y axis 6460 in some examples shows simpler security methods on the bottom and increasing levels of security at the top.

Basic Security 6462 6464: In general there is not expected to be a charge for basic security. Normal use of a Local Teleportal (LTP) 6462/Mobile Teleportal (MTP) 6462 has a level of security and privacy that parallels making a normal phone call on the telephone network, or establishing a unicast or multicast session with an Internet browser. If configured for using TP Shared Spaces connections 6462, physical security can be added to an LTP 6464 and/or an MTP 6462 to prevent it from being hacked, and to prevent its camera and/or microphone from being used unobtrusively for surreptitious observation (e.g., from observation through spying). This additional physical security comprises a physical cap 6464 that is automatically slid over the device's camera and/or microphone to block visual and audio communications when it is not in active use. The same cap 6464 is slid away from the camera and microphone when it is utilized for TP Shared Space(s) connections allowing their video and audio communications. This cap is moved automatically by means of a small motor and hinge that is activated by entering a TP Shared Space or by leaving it, or by manually directed control (s).

Medium Security 6466 6468: In general, there may be an additional charge for this additional level of security. TP Shared Space(s) may be encrypted 6466 by means of known encryption technologies. In this case a registered user logs in (with a user ID and password) then enters an encryption key or encryption phrase. The user specifies whether this is a public key or a private key, and whether encryption is to be applied for this TP Shared Space only, or to have encryption always turned on for TP Shared Spaces. While encrypted, these TP Shared Spaces are transported across the normal network. As an additional security precaution, TP Shared Space(s) may be routed through a TP Network encryption system and server 6468, which provides a dedicated resource and system (using known security technologies) for routing and encrypting these phone calls. These TP Shared Space(s) are routed through a secure messaging transport system and server, where a plurality of steps are designed to increase the level of security by various known network, server and communications security management means.

High Security 6470 6472 6474 6476: In general, there may be an additional charge for this additional level of security. Device level encryption for LTP's 6470/MTP's 6470 can be provided, with automated TP Network 6472 integration by means of a TP network security server. This employs a security system that runs simultaneously at the LTP 6470/MTP 6470 and the TP network security server 6472. Said security system utilizes the creation of random device level keys, random but frequent key replacement cycles, automated registration of each new key with the LTP 6470/MTP 6470 and TP network encryption server 6472 and automated encryption/decoding/encoding at the appropriate devices 6470 6472. In a typical TP Shared Space, utilizing this security system, this device level encryption key is employed to encrypt the TP Shared Space at the sending (LTP/MTP) device 6470; it is then decrypted using that devices key at the TP network security server 6472, then re-encrypted by that same TP network security server using the device level key of the receiving (LTP/MTP) device 6470. As that Shared Space is entered at the receiving device 6470, it is decrypted by means of that device level key. These TP Shared Space(s) are transported as encrypted messages, with a vulnerability at the TP Network security server(s) 6472. Said security server would be protected by multiple, strong defenses and monitoring of security systems. An additional level of high security can be provided by means of a VPN (Virtual Private Network) 6474. Utilizing known technologies, a VPN provides additional security for the transport of TP Shared Space(s) across the network 6474. It accomplishes this by constructing a private VPN tunnel or network across the public network, and employs encryption and other security means so that only an authorized Teleportal may access the VPN and its data cannot be intercepted. The final, highest security level utilizes the combination of a VPN to a private, dedicated TP Network security server 6476. This provides LTP callers with the combination of a private network and a private security server 6476. Along with this, LTP/MTP device level encryption 6470 6472 may be included.

Together, in some examples these security services may be combined to provide multiple layers of simultaneous security 6464 6466 6468 6470 6472 6474 6476, so the desired level of security may be attained.

Figure 137:
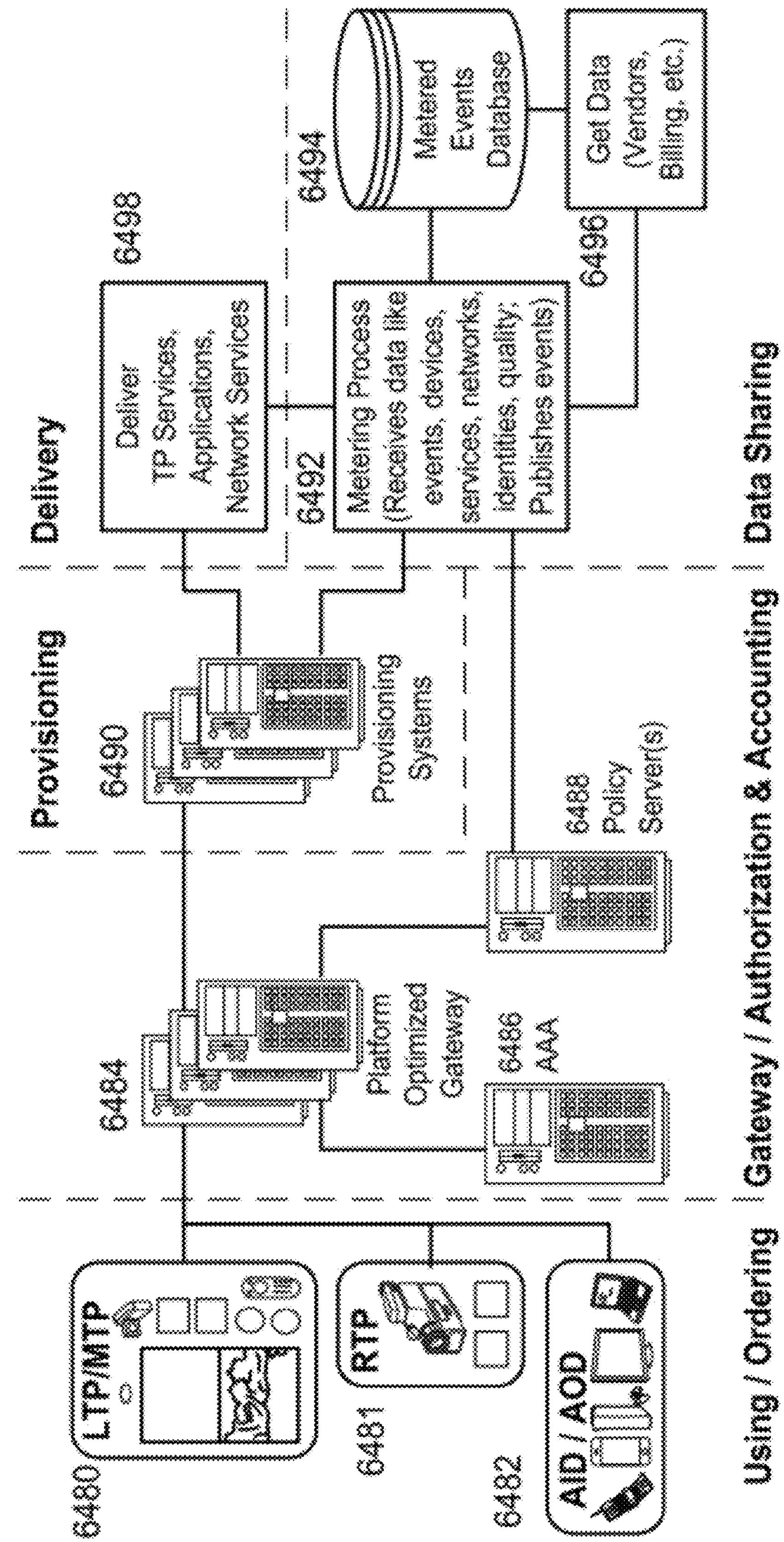

Data sharing services (Utility service 6430): In some examples shared data is another service that is shared across the TP platform 6400 in FIG. 135. Turning now to FIG. 137, the high-level process for sharing said data is illustrated. In some examples this comprises five main stages: Using/ordering, Gateway/authorization and accounting, provisioning, delivery and data sharing.

Using/ordering 6480 6481 6482: Any Teleportal (TP) service or device are used in any way to send and/or receive any Teleportal service, including Local Teleportals (LTP) 6480, Mobile Teleportals (MTP) 6480, Remote Teleportals 6481, Alternative Input Devices (AID) 6482 and Alternative Output Devices (AOD) 6482.

Gateway/authorization and accounting 6484 6486 6488: In some examples said user/ordering 6480 6481 6482 of Teleportal services enters at the TPU Optimized Gateway 6484. The user and/or device may be authenticated and authorized by a AAA Server(s) and/or AAA System(s) 6486 that contains stored user (or device) profiles that include accounting information such as which TP plans are purchased and which services are authorized for that user (and/or device) under said purchased plans. When the AAA Server's 6486 data is known then policies may need to be applied to create and provision that session, such as a higher-speed or reduced latency for some types of synchronous communications sessions. These policies may be stored and applied by means of a Policy Server(s) and/or Policy System(s) 6488.

Provisioning 6490: In some examples authorized sessions are configured and provisioned by Provisioning Server(s) and/or Provisioning System(s) 6490. Data is shared across the TP platform 6408 in FIG. 135.

Delivery 6498: In some examples once provisioned 6490 the TP service(s), application(s) and/or network service(s) is delivered 6498 by means of TP devices 6480 6481 6482.

Data sharing 6492 6494 6496: In some examples a metering system and process 6492 receives session and other data from the provisioning system 6490 and from delivery of TP services, applications, etc. 6498. In some examples these data include events such as starting and ending a session, in some examples devices such as a Local Teleportal or a mobile phone, in some examples a service such as viewing a Remote Teleportal location or sending a Teleportal broadcast, in some examples the quality of service provided (eg, speed and bandwidth), in some examples accounting data such as the identity of the user and the relevant purchased plan for that service, etc. Said data are published for other TP services to utilize in some examples such as adjusting the quality of service provided by the provisioning system 6490 and/or the delivery of services 6498, in some examples published as available messages as needed by other TP services (see TP Platform Messaging FIG. 138 below), in some examples stored in a Metered Events Database 6494, in some examples provided to the Policy System(s) and Policy Server(s) 6488 to improve the performance of the TP Network and TP devices 6480 6481 6482, in some examples stored metered data 6494 remains available for various TP services and vendors 6496, such as from billing systems 6496, etc.

Figure 138:
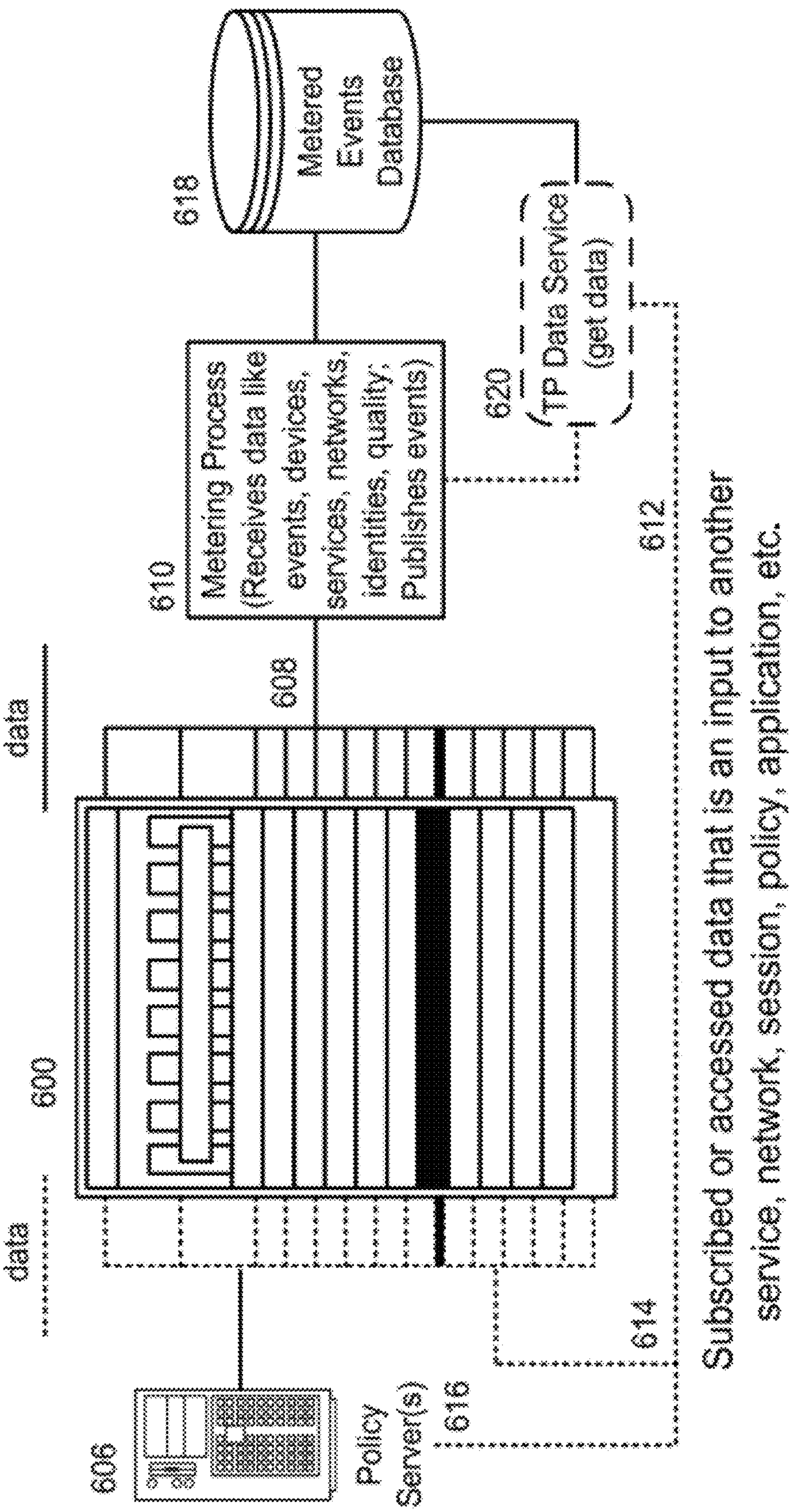

TPU messaging (Utility service 6430): In some examples data is shared across the TP platform 6400 in FIG. 135. Turning now to FIG. 138, the high-level process for Teleportal messaging is illustrated. Two main methods are illustrated in this figure: publish/subscribe and SOA (Service Oriented Architecture).

Publish/subscribe. 602 608 610 620 612 614: In some examples components of the TPU 600 publish their data 604 608 to a metering process and/or metering system 610, which acts as an intermediary broker 610. Components of the TPU 600 may also subscribe to this intermediary broker 610, with each subscription registered with that broker 610 612, and the resulting data received from it 614. This process allows TPU 600 data to be sorted and filtered into classes or hierarchies by the metering process 610 without needing to know which components of the TPU 600 might subscribe or not subscribe to it. Similarly, in some examples components of the TPU 610 can subscribe to the TPU's published data. 608 610 612 without needing detailed knowledge of the TPU's components. 600.

Data-as-a-Service (DaaS), or Information-as-a-Service (IaaS) 608 610 618 620 614: In some examples, in a continuation of the metering process and/or metering system 610, said data is stored in a metered events database 618. In some examples by means of a data service 620, the components of the TPU 600 may request said data by means of a data service from the metered events database 618. In some examples this data service provides an abstracted process that utilizes data collected from across the TPU 600 for using and reusing said data for multiple purposes and processes 600, such as for real-time operations, third-party services, billing for said operations, etc. In some examples the result is an increased ability to automate the creation and maintenance of TPU-wide data services, regardless of the diversity of the sources of said data—which enables a more scalable TPU 600.

In addition, to automatically and manually improve the performance and management of the TPU 600, in some examples a Policy Server(s) 606 receives appropriate data from the metering process 610 612 616, and/or data from the metered events database 618 620 616. Both of these are loosely coupled architectures so that TPU components 600 do not need to know of the existence, functionality or performance of other TP components, allowing them to evolve independently from each other, even if provided by multiple vendors. The focus of both systems is the data each requires to operate, regardless of the performance of other components. In some examples with a constantly running metering process 610 that receives available data continuously 608, platform components 600 can access data by subscription 612 and/or request it as a data service 620 as needed for their operation and performance.

In some examples by utilizing two systems 610 618, a continuously operating back up is provided, in case one system encounters a failure or delay. In some examples if a platform component 600 publishes data required by a different platform component 600, but the second component does not receive this from the metering process 610 620, then it can utilize a fall-over redundant process of accessing and acquiring that data from the metered events database 618 620. In some examples if a Teleportal session has an error, this provides a plurality of opportunities and procedures for identifying and fixing the error dynamically, as well as opportunities for updating the TPU's policies 616 606 to limit or prevent the error's re-occurrence in the future.

In some examples the metered events database, 618 provides considerable data resources for Platform Management Systems that may include (1) real-time monitoring of Platform performance, (2), SLA (Service Level Agreement) reporting of guaranteed levels of Teleportal services, (3) billing and payment systems for services consumed, and (4) Business Intelligence analyses and reporting of the growth and new usage of Teleportal services, applications and networks over time.

Managed transport (6428): In some examples a single device such as a Local Teleportal (LTP) 132/Mobile Teleportal (MTP) 132 in FIG. 8, a Remote Teleportal (RTP) 133, or an Alternative Input Device (AID) 134/Alternative Output Device (AOD) 134, might be used for different types of Teleportal Network uses such as viewing Remote Teleportals 52 in FIG. 3, using Teleportal Shared Space(s) 55, receiving Teleportal Broadcasts 53, performing Teleportal Applications 53, utilizing any other Teleportal Networks 58, attaching a Virtual Teleportal 60 to other devices, or Entertainment/RealWorld Entertainment 62. In some examples a plurality of these are synchronous real-time two-way communication services that require high-speed, sufficient bandwidth and less latency, however some may be asynchronous services that can be provided by queued messages. Some examples of an asynchronous service included a guided travel itinerary 59 provided by means of an Application such as Remote Control 60 which then utilizes a TP Travel Network 59 for Chained Viewing of a sequence of Remote Teleportals 52 and associated information and other resources that bring to life a travel destination. Therefore, in some examples the TPU is designed to provide differentiated services for synchronous and asynchronous networks and services.

Figure 139:
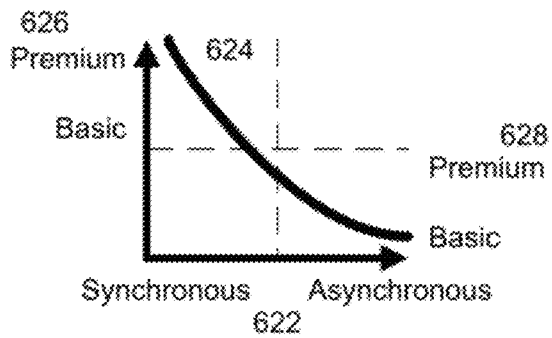

Services latency (6428): Turning now to FIG. 139, some examples show a high-level summary of the latency of differentiated services that can be provided by the managed transport layer 6328 in FIG. 135. on the X axis 622 synchronous services are on the left, while asynchronous services are on the right. In some examples synchronous services 626 require real-time two-way communications with low latency and high quality. Even within this category, premium services 624 can be provided at higher prices with greater speed, greater bandwidth and measured SLA (Service Level Agreement) enforced services. Basic services can have somewhat slower speed and greater latency 624, even though they are synchronous in nature. In some examples asynchronous services 628 are those where messages and connections can be queued. Even with queuing it is possible to differentiate premium from basic services 628 whereby premium services have greater speed and lower latency than basic services.

Figure 140:
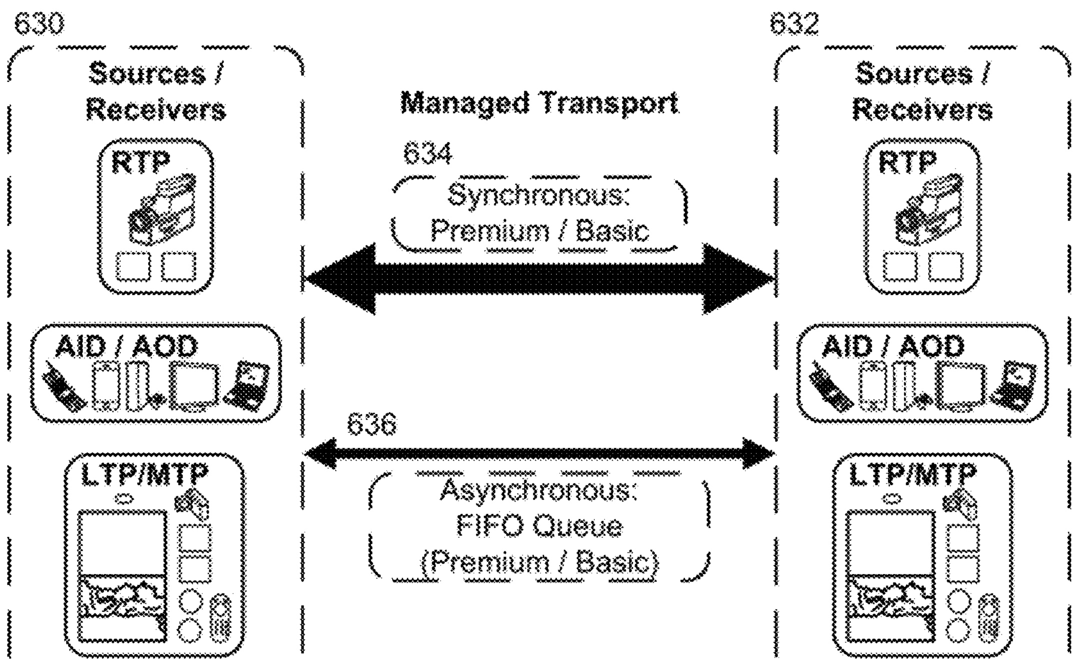

Differentiated services (6428): FIG. 140 provides some examples of an initial operations illustration of managed transport (layer 6428 in FIG. 135) and the services latency curve in FIG. 139, by showing the differentiated services. In FIG. 140. In some examples the Sources and Receivers 630 632 include: Remote Teleportals (RTP) 630 632; Local Teleportals (LTP) 630 632/Mobile Teleportals (MTP) 630 632; Alternative Input Devices (AID) 630 632/Alternative Output Devices (AOD) 630 632: These include devices such as mobile phones, PCs, laptops, networked video games, televisions linked to cable and/or satellite networks, and other devices linked to the Internet or other communications networks. In some examples managed transport may be provided between sources and receivers 630 632 using service classes such as synchronous 634 and asynchronous 636, as defined above. The differences in speed and bandwidth are reflected in the figure by the thicker and bolder arrow for synchronous real-time communications 634 which requires less latency, as compared to the thinner and narrower arrow for asynchronous communications 636 in which greater latency is normal. In some examples the major service classes such as synchronous 634 and asynchronous 636 may be further subdivided based on speed and bandwidth using categories such as premium (with greater speed and bandwidth within the synchronous or asynchronous classes of services) 634 636, and basic (with lower speed and less bandwidth within the synchronous or asynchronous classes of services) 634 636. Other levels of service quality are described below, with criteria for specifying them.

Differentiating initial session services (6428): In some examples an individual session's differentiated service may be set up by means such as those illustrated in FIG. 141. A session may be initiated by a source 640 such as a Local Teleportal (LTP), a Mobile Teleportal (MTP), a Remote Teleportal (RTP), or an Alternative Input Device (AID) or Alternative Output Device (AOD). These access Teleportal services by means of the Platform Optimized Gateway 642. In turn this accesses a AAA Server(s) 644 to authenticate the user and access the user's profile to determine the users subscription plan which identifies the service class to provide (such as premium synchronous) for the type of service requested in that session. In some examples the characteristics of that service class in that vendor's subscription plan may be provided by means such as a Policy Server(s) 646, such as the relative speed, bandwidth, SLA (Service Level Agreement) requirements, etc. These data are used by the Platform Optimized Gateway to provision that session. The actual transport is provided by known data networking means such as:

Aggregation 648: In some examples once provisioned each user's session accesses the network by means of an aggregator, which provides integration of simultaneous multiple media and services such as video, voice, data, multicast broadcasts, entertainment, VPNs (Virtual Private Networks), online games, collaborative videoconferencing, entertainments, multiplayer online games, and other services. In some examples some aggregators permit multiple levels of quality of services so users may receive differentiated services 624 628 in FIG. 139 appropriate for their subscription plan and session.

Routing/Distribution 650 652 and Core/Internet 654: These known networking services provide differentiated levels of service quality based on whether they are part of the TPU or outside of it, and whether the networking hardware employed is capable of delivering differentiated levels of service quality. If not, then the service delivered is the normal "best effort" that is provided by the Internet and/or the private communication network. However, if part of the TPU and enabled for providing differentiated services, then transport may be managed across these devices 650 652 654. The means for providing such appropriate levels of services quality is examined in FIG. 142 below.

Optimizing service quality/dynamic quality monitoring and improvement (6428): In some examples it is not sufficient to provision the right speed and bandwidth when initiating a session as in FIG. 141. For premium synchronous services especially 624 626 in FIGS. 139 and 634 in FIG. 140, and for a plurality of basic services as well 626 in FIGS. 139 and 634 in FIG. 140, customers expect two-way high quality, video and audio and other communications, with increasing expectations over time as high definition, 3D, or other advancing display capabilities evolve and become standard. This requires a TPU service(s) that dynamically monitors and (if needed) adjusts service quality.

Turning now to FIG. 142, some examples provide the TPU service for optimizing service quality dynamically to a range of levels that are dynamically metered 684, measured 672 and provisioned 664 utilizing metrics such as: At the low end, equal to "Internet" or better. At a mid-level, exceed "Internet best effort" even under high network congestion and peak loads. At the high end, deliver an SLA (Service Level Agreement) required level of predictable and measurable high-quality synchronous services even over a congested network (s).

Figure 141:
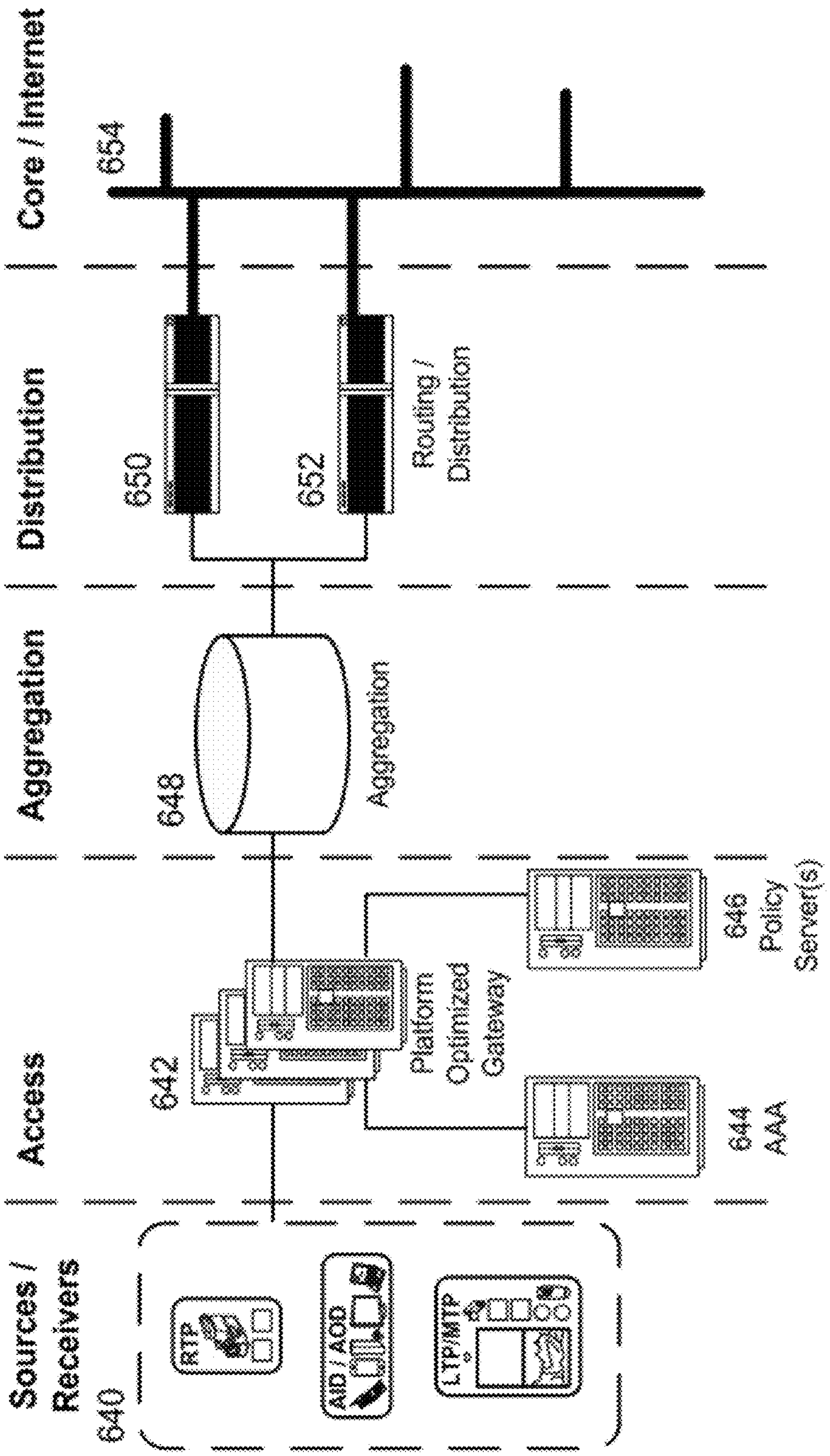

In some examples this TPU service operates in a manner similar to FIG. 141 wherein differentiated initial sessions are created. Dynamic quality monitoring operates by means of the TPU's metering process 6492 in FIGS. 137 and 610 in FIG. 138 which receives data such as events, devices, services, network transport, identities and service quality. In FIG. 142 metering process 684 receives said data over feedback channels 686 including two-way network latencies such as: Send and receive events and delays 674 by local equipment at customer's head ends such as Local Teleportals 656, Mobile Teleportals 656, Remote Teleportals 656, and Alternate Input Devices and Alternate Output Devices 656. Network access events and delays 676 by the session set up and provisioning process steps such as the TPU Gateway 658, AAA authentication and authorization 660, policy management 662 and provisioning 664. Aggregation events and delays 678 by aggregators 666 such as aggregation routers and systems. Routing and distribution events and delays 680 such as by network routers and switches 668 such as at third-party networks, partners, the Teleportal Network, etc. Core network events and delays 682 by a core network(s) 670 such as the Teleportal Network, a partner's network, a peering network and/or the Internet.

In some examples these metered data 672, which may include related data at steps such as events, devices, services, network transport, identities and service quality, are provided to the metering process 684 by feedback channels 686. As described above, data from metering process 684 is published for loosely coupled subscription 612 614 and use by TPU services 600 in FIG. 138, or it is stored in metered events database 618 where it can be accessed by SOA data service(s) 620.

Managed transport services for TPU quality (6428): In some examples one way to deal with the large volumes of network traffic that are typically generated by a plurality of real-time video and audio streams, which are expected by a TPU, is to provide the differentiated services described above FIGS. 139, 140, 141, 142 by the Managed Transport layer 6428 in FIG. 135 of the TPU 6400. Providing these differentiated services levels of bandwidth for said processes 702 704 706 707 in FIG. 144, such as for optimizing session quality and/or for limiting bandwidth usage, in some examples may be provided as one or a plurality of rules-based services to the TPU 6400 in FIG. 135 so that it may be accessed and utilized such as by Teleportal Networks 6404, and vendors such as Third-party systems (OSS/BSS) 6406, and Partners/Supply Chains/Services Ecosystems 6408. Said services would be provided by means such as shown in FIG. 137 "Share data and services" and FIG. 138 "TPU messaging."

Figure 135A:
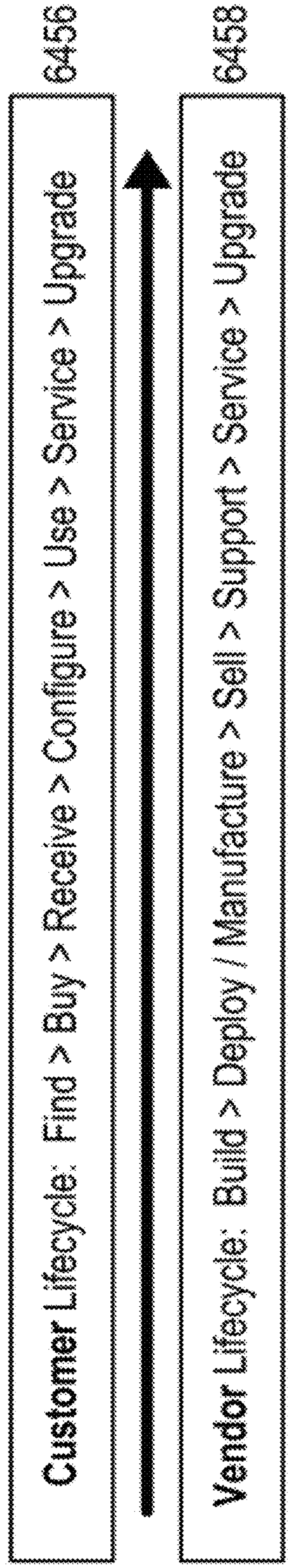
Figure 135B:
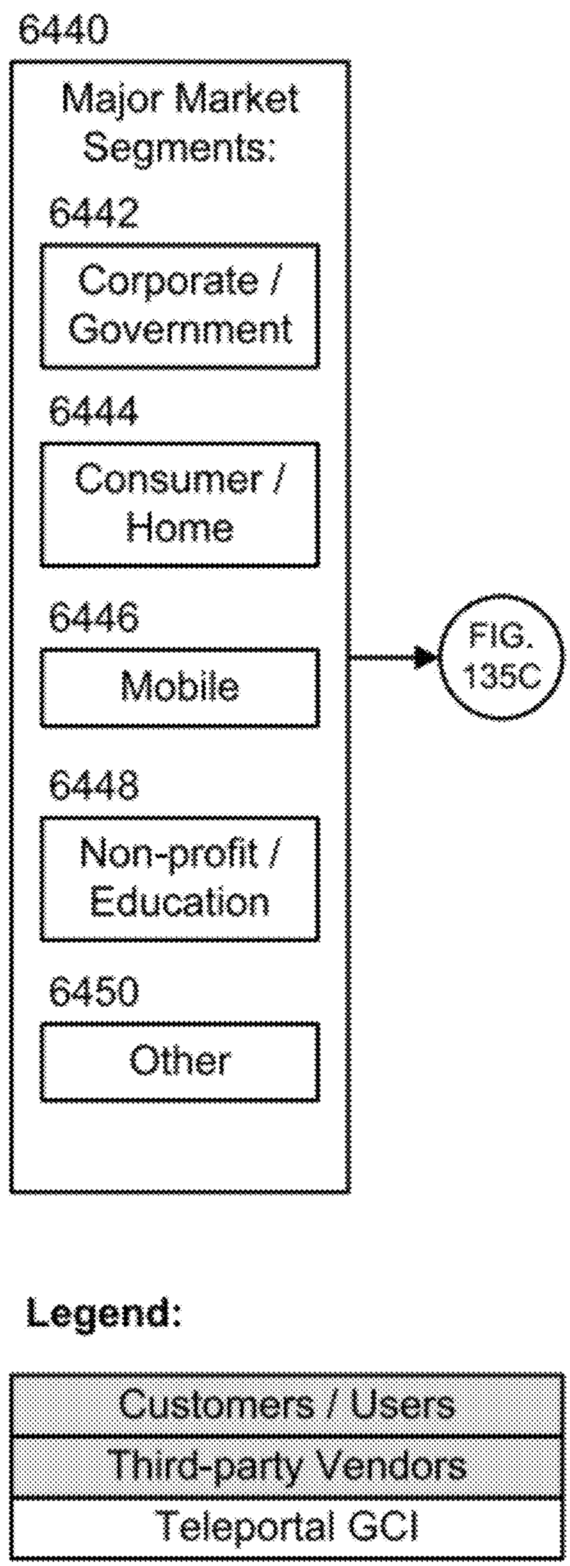
Figure 135C:
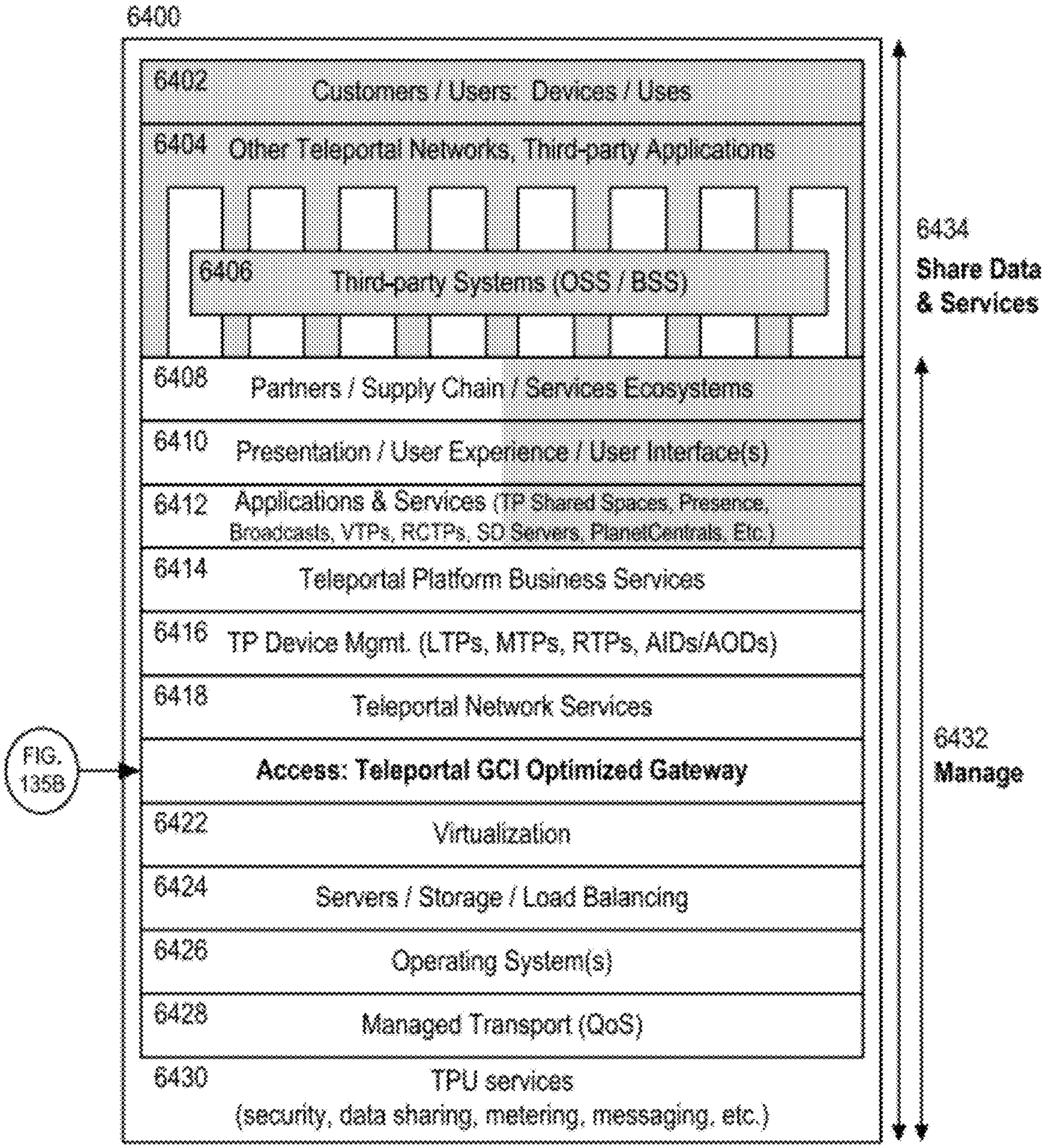

In addition and because customers and their devices 6402 in FIG. 135 are responsible for using these potentially high volumes of bandwidth, as well as for needing optimized session quality FIG. 142, in some examples it is possible to provide said processes as services directly to customers so they may monitor and adjust their bandwidth usage themselves. In some examples these services may be included as features in the interface(s) used to control devices such as Local Teleportals (LTP) 656, Mobile Teleportals (MTP) 656, Remote Teleportals (RTP) 656, or Alternative Input Devices 656/Alternative Output Devices 656. Said services may provide abilities such as:

Vendors may optimize or increase service quality dynamically: In addition to Provisioning Systems 664 in FIG. 142, in some examples said services may provide metered events and latency/delays data services 672 from metering process 684 in FIG. 142 throughout Teleportal Networks 6404 in FIG. 135, their Third-party systems (OSS/BSS) 6406, and Partners/Supply Chains/Services Ecosystems 6408 which may utilize these services data to adjust the quality of service(s) delivered to their customers during a plurality of types of Teleportal sessions. In some examples if repeated delays or other repeated latencies warrant, then said metering process data may be transmitted by vendor systems to Teleportal policy server(s) 662 to adjust policy-level configurations 662 applied to initiating similar types of sessions by the TPU Gateway 658 for those vendors' customers (until new metered conditions 672 684 warrant updating said policy configuration again 662).

Vendors may also need to optimize their network or services efficiency and capacity: In some examples vendors may achieve this by limiting excess bandwidth usage beyond what has been bought under a services plan or subscription: In some examples a session or customer might become a network problem if they exceed the bandwidth for which they have subscribed or paid, especially during peak network usage hours when there is network congestion. If a customer has purchased a plan that includes a bandwidth limit but exceeds that during network congestion, then said session events data service 672 684 may include the volume of data and/or bandwidth utilized. Network efficiency may be improved if those vendors combine said service with customers' subscribed plan that specifies bandwidth limits, and enforces that limit during network congestion. this may be achieved by said vendor receiving session data from said service 672 684, comparing that to customer plan data and bandwidth data to determine excessive usage, and providing said customer's bandwidth limit to provisioning system(s) 664 to adjust the volume of bandwidth delivered to said customer during said session so that it fits the bandwidth for which they have subscribed and/or paid. If repeated bandwidth excesses or other repeated excesses warrant, then said vendor may provide that to AAA server(s) or systems 660 and/or policy server(s) 662 to adjust policy-level configurations 662 applied to that customer when initiating similar types of sessions by the TPU Gateway 658 (until new metered conditions 672 684 or a new subscriber agreement, such as upgrading from basic to premium service, warrants updating said customer's said policy configuration again 662).

Customer self-management of limited bandwidth—some examples: Said data and services 672 684 in FIG. 142 may be utilized in some examples to enable customers to see the time of day when their bandwidth usage is highest compared to network bandwidth availability, so users can adjust their time of day usage and/or LTP's storage capabilities to off-peak times when bandwidth limitations are not needed. In some examples if a customer's local LTPs have the ability to store video, then some types of live events such as entertainment could be downloaded and stored during off-peak nighttime hours, for later on-demand viewing whenever desired—without requiring Teleportal Network use during peak hours if that is when said entertainment is viewed.

Customer self-management of limited bandwidth—some examples: Said services 672 684 in FIG. 142 may also be utilized so that customers can see which services and applications utilize the most background bandwidth, In some examples a customer may keep several live video thumbnails open to keep their LTP ready to switch to other RTP locations. By displaying the bandwidth required to produce these live view thumbnails, customers could adjust those background processes such as switching from a live video feed from multiple potential RTP locations to displaying only a single recent "still" snapshot from each of those remote locations, while keeping their LTP's main view as live, real-time full-stream video and audio.

In sum, the design and architecture provide means to provide data services that may be used to improve quality by both vendors and customers—so that participants and users of a TPU have continually increasing abilities to raise its quality while lowering their costs.

Managed transport bandwidth reduction—multicast (6428): Bandwidth reduction is potentially a network management issue for services and applications that utilize a high volume of video and audio data, in some examples for synchronous communications such as Teleportal Shared Space (s), viewing Remote Teleportals, broadcast networks created by individual users, etc. Known networking technologies, designs and architectures provide options that may be utilized to reduce Teleportal Network bandwidth. Turning now to FIG. 143, a number of these options include:

Multicast 692: In some examples IP Multicast provides one-to-many distribution of data from one source 688 to a plurality of destinations 690 simultaneously. Multicast delivers only one stream from a source 688, and this provides an efficient means for streaming video and audio on the Teleportal Network because of scalability—a small to a plurality of receivers 690 may join that one stream and receive it. In some examples if one Remote Teleportal (RTP) 688 is streaming an event of strong interest, a plurality of receivers 690 could join that source to view its video and audio without the source RTP or Teleportal Network needing to know who each receiver is, or the number of receivers. Multicast distribution is initiated dynamically by the network nodes (such as an RTP, network routers or switches, etc.) which allows this to scale to a large potential receiving population from each source.

Unicast 694: In some examples Unicast is a transmission between one web source and one user, which is limited to one video/audio stream to one user at a time, so it typically applies to directed communications such as Teleportal Shared Space (s). However, if there are multiple receivers in an audience of any substantial size, unicast requires a large amount of bandwidth as well as processing because it must send a separate (yet identical) stream to each individual receiver at the same time. Thus, while Unicast may be utilized widely in a Teleportal Shared Space Network, Multicast may be preferred for a simultaneous broadcast to a public or private audience, or for viewing RTP's in a Teleportal Network.

IP Broadcast: IP broadcasts provides the widest type of distribution but with the least control. When an IP broadcast is sent, it is received by every device on a network. In a Teleportal Network some examples of IP broadcasting may include a limited number of uses such as for certain types of Alerts.

FIG. 144 shows how both Multicast and Unicast are utilized to reduce bandwidth on the Teleportal Network 698. For most uses by native Teleportal Network devices (LTPs, MTPs, RTPs, AIDs/AODs) 696, the Platform Optimized Gateway 642 in FIG. 141, as specified in each customers AAA user, device and services profile 644, and specified in the Policy Server's configuration 646 for most sessions. In some examples as shown by the thin arrow 702 in this figure, multicast requires less bandwidth than the thicker arrow used to show the higher bandwidth requirements of unicast 704 and is generally utilized across the Teleportal Network(s). In some examples for some pre-specified services (such as Teleportal Network Shared Space) any appropriate protocol may be utilized for each session (assuming all participants have compatible software and hardware, and server application[s] if needed) such as H.323, SIP (Session Initiation Protocol), MGCP (Media Gateway Control Protocol), RTP (Real-time Transport Protocol), ITU (International Telecommunications Union) H.320, ITU H.264 SVC (Scalable Video Coding), unicast, multicast UDP messages, etc. However, in some examples it may not be possible to provision some of these protocols, such as multicast 706, for Alternative Input Devices (AID) 700 or Alternative Output Devices (AOD) 700. Therefore, AIDs/AODs may be enabled for each protocol, such as multicast 706, when both appropriate and possible, but may utilize unicast 707 more frequently then native TP devices 696.

Managed transport bandwidth reduction—compression (6428): Compression is another known technology that may be incorporated to assist with large volumes of network traffic. As shown in FIG. 145, when added to a potentially widely applied new communication technology such as a TPU, in some examples network-wide compression may add a performance-enhancing capability. As illustrated by this figure, native TP devices such as RTP's, LTP's and MTP's 708 710 may be automatically designed and configured for compression 714 by default. In some examples this provides means for TP vendors and users to receive this functionality 714 without needing to know how to design it, add it, select it or apply it. In addition, by including it as a default it may be provided as a universal service that requires less code to operate and substantially less administration centrally, by third-party vendors or by customers. However, in some examples it is not always possible to include compression 716 718 for some devices or connections, in some examples for Alternative Input Devices (AID) 712 or Alternative Output Devices (AOD) 712. Therefore, these devices and/or connections, such as AIDs/AODs 712 are compression enabled 716 when possible, but not compressed 718 when not possible.

One issue with compression 714 716, however, is its simultaneous use with encryption 6466 6468 6470 6472 6474 in FIG. 136 "TP Communications Security and Privacy." In sessions where both encryption and compression are employed, in some examples they may need to be utilized in an appropriate order. In some examples for certain types of encryption 6466 6468 the data stream may be compressed first 714 716 and then encrypted 6466 6468. In some forms of security, such as with a VPN tunnel 6474, the VPN itself is an encrypted data stream so compression 714 on the Teleportal Network 710 may be employed to support that, but perhaps not outside the TP network if the non-TP network does not employ compatible compression. Because various security products, algorithms and systems may be employed FIG. 136, however, in any case where a form of encryption does not work properly together with TP Network 708 710 712 714 716 compression, compression may be turned off automatically and transparently (such as at the policy level) for those incompatible types of encryption. In some examples when any of these incompatible forms of encryption are included in a user's or device's profile 644 in FIG. 141, or requested by a customer as a security service 6466 6468 6474 in FIG. 136, as these incompatibilities are determined the incompatible forms of encryption may be added (such as to Policy Server [s]) 646 in FIG. 141. Thus, Policy Server(s) 646 may auto-disable an incompatible form of encryption at the appropriate step(s) during a TP session.

TPU operating system (6426): As a communications ecosystem this potentially includes a a plurality of devices, applications, etc. that may be derived from the descriptions herein, as well as their services, locations and installations from a plurality of sources. From a supplying vendor viewpoint one or a plurality of operating systems may be used on various components. Thus, there are some choices of one or a plurality of operating system(s) for one or a plurality of components illustrated in FIG. 3: Teleportal Devices: Local Teleportals 52, Mobile Teleportals 52, Remote Teleportals 52. TP networks and systems: Teleportal Network 102 and other Teleportal Networks 53 55 58 (some examples of "Other Teleportal Networks" may include Social Networks, Business Networks, Sports Networks, Education Networks, etc.) TP communications network: Teleportal Shared Space Network 55 TP broadcast network: Teleportal Broadcast Network 53 TP access to a plurality of types of applications: TP Applications Network(s) 53 TP use of Subsidiary Devices: TP Remote Control 60 Adding Teleportaling to multiple other devices, websites, etc.: Virtual Teleportals 60 Entertainment and RealWorld Entertainment: Use Teleportals to create and/or enjoy various types of entertainment, and/or RealWorld Entertainment 62 (as described elsewhere) TP infrastructure: Teleportal Utility (TPU) 102.

Turning now to FIG. 146 five operating systems are presented 720 722 724 726 728 730 as some examples of Teleportal Utility and TP Devices operating systems: Internet-like 722, Apple-like 724, Windows-like 726, Mobile-like 728, Standards/API-like 730. Selecting one of these operating system options has a major performance impact, as well as financial consequences for parties who might use, apply or sell products for this. Therefore, this is explicitly designed to provide inclusion for one or a plurality of Operating System choices 720.

Regardless of which one or a plurality of operating systems (OS's) 720 722 724 726 728 730 are selected, the OS is an executable software program(s) that supports the simultaneous and integrated operations of devices, components, systems, infrastructure, etc. Typically the OS facilitates I/O with storage devices, peripheral devices, network interfaces, etc. It typically communicates with elements of itself, software programs, user interfaces (though the OS may or may not be directly visible to the end-user), communications networks, memory, input and output devices, etc. It may be more scalable, secure and fault tolerant such as both proprietary and open source OS's employed in the Internet, or it may be less secure and/or less scalable OS such as Microsoft's proprietary single-user Windows OS. In the area of communications the OS may optionally provide or not provide communications protocols and network interactions such as TCP/IP, unicast or multicast.

Internet-like 722: The Internet evolves rapidly and is starting to move beyond Web 2.0 to evolve an operating system 722 that supports cloud resources of independent domain-based applications and services. As described in the TPU's virtualization layer 6422 in FIG. 135, this cloud includes a virtual architecture FIG. 150. This architecture contains virtual provisioning 770 in FIG. 149, virtualized network services 774, virtualized computing 778, virtualized services 780 and virtualized storage 776.

From the user's viewpoint 766 and 781 in FIG. 150, some examples of how this might appear is Google's Chrome browser with its conversion of the Web browser from a single-threaded process into individual isolated processes (with a separate process under each tab). The impact is to isolate each web process, a parallel to a Web-focused operating system that runs each URL as if it were its own separate application.

As an operating system architecture for this Teleportal ecosystem, an Internet-like 722/Google Chrome-like interface has a some advantages: The browser can be presented to customer end users as the complete interface with applications, data and other resources "in the cloud." In fact, a customized version of this type of browser might be the only interface that LTP, MTP and RTP end-users need to see and touch. This browser-based interface can run on any operating system that a browser like Google's Chrome can run—BUT the end-user never even needs to know which operating system has been used. Hiding the underlying OS protects end-users from having to deal with time-consuming OS's like Microsoft Vista or the complexities of technically-focused OS's like Linux or Unix. From a hardware viewpoint one or a plurality of OS's may be used on various components, so making this browser appear to be the OS supports a wide range of hardware in Teleportal devices. With this architecture each RPT location can multicast and/or unicast one or a plurality of streams, each LTP or MTP can simultaneously view one or a plurality of RTP's, applications or other IPTR, or multiple LTP's on one wall can simultaneously view one combined RTP scene. When any process is terminated its process is destroyed and its memory is deallocated. Google Chrome also supports "Incognito" processes that does not log what is done using the browser, which can provide some types of anonymity and/or privacy for some activities. A browser-based interface also provides direct access to the entire web, websites, e-commerce and search. A browser-based interface also provides access to Web-based ("cloud") applications like online e-mail, office software, and applications/services like online banking. This could be delivered with an Internet-like browser-based interface 722 without millions of non-technical users needing to buy or struggle with a local operating system, or buy and use software applications like Microsoft Office 2007's ribbon interface—which are what users are required to buy to use most new PCs or laptops (unless they have an older version to install).

In brief, a directly usable 722 LTP may make it unnecessary for one or a plurality of end-users to purchase a PC, netbook, mobile phone or other type of device in order to gain access to the web, online communications and some or a plurality of those devices' functions and/or software applications (by means such as online substitutes, remote control of remote devices, etc.)—while gaining their functionality plus additional functionality from this Teleportal Machine and its associated networks and services.

Apple-like tethered appliances and store with proprietary channel control: Apple has created successive breakthroughs that now dominate digital music and tablets, and transformed smart mobile phones. These are based on tethered appliances in a closed, managed system 724 that includes devices such as the iPod, iPhone and iPad; as well as the iTunes online store for music, games, applications, content, device updates and more. Apple controls the user experience across the devices and applications in its distributed system 724, yet still provides a semi-open ability to download a plurality of songs, shows, education, applications, games etc. to its devices.

As an operating system architecture for this Teleportal ecosystem, an Apple-like or Apple-based operating system has some advantages: Apple's user experience dominates digital music, has driven substantial market share gains in mobile phones, and expands Apple's sales of tablets, laptops and personal computers (even though those prices are far higher than Windows PCs). Apple's integrated device/system/content integration of iPods/iPhones/iPads/iTunes that relegates operating systems, software products, the Internet and mobile phone networks to serve primarily as transport media for a closed system of devices, applications, games, content, servers, etc. when Apple's proprietary products are used. Apple's integrated look and feel eliminates many of the frustrations that non-technical users have with leading operating systems, software apps that have interface issues, web sites most of which have unique navigation and content difficulties, and other devices' multiple advanced features that are difficult to understand, learn use.

Apple's integration covers many aspects of design, development distribution, services, sales, etc. such as: Design and development: In addition to designing and developing their own hardware products and software, Apple sells and distributes three professional and consumer-level tools and SDK's for creating salable software and content such as iPhone software products, videos, music, web sites, documents, etc. Development (hardware) systems: Apple sells high-end systems to developers to use in their design and development projects. Selling music and software applications: Apple owns the US's #1 music retailer iTunes, as well as a large and growing online store for iPhone software applications. Online services: Apple's MobileMe services provided integrated online systems for e-mail, contacts, calendars, photos, files and some Web applications. Accessories sales and licensing: Apple sells some of its own accessories such as headsets, docking stations, etc. They also license some third-party accessories. Retail stores: Apple has iTunes, a global online store. Also, Apple's chain of retail stores is substantial and produces significant sales revenue per square foot.

On the other side there are price and cost disadvantages to Apple products, as well as Apple restrictions on what it accepts from third-parties, such as arbitrarily permitting or blocking applications that may be sold and downloaded from Apple's iTunes Apps store. Apple clearly wants a "tethering" system that controls developers, partners, services, products and customers more than most major vendors—yet as Apple shows, this does not stop a company from leading a plurality of large industries such as music, smart phones and online "tethered" stores.

Though Apple's cost and lack of openness are serious negatives, it is impossible to ignore the positives of Apple's leadership in the delivery of quality designs, systems, interfaces, tools and content. In some examples for how to design and implement an integrated hardware and software system, there are ample positive reasons why Apple's model 724 would make an excellent operating system.

Windows-like 726: Microsoft has such impressive market power that it is able to create and market an operating system (Vista) 726 and software products (Office 2007's ribbon interface) that are disliked, considered difficult and frustrating by many customers—yet its lock-in of customers, distributors and vendors of PC's, software and peripherals is so tight that it maintains preeminent dominance over new computer sales. The major reason to use a Windows-based operating system 726 is because of those related hardware, software and services vendors. Their range of easily available products and technical/support services are helpful to any broad Teleportal build out.

Any actual implementation of a Microsoft operating system 726 or software, however, should hide Microsoft's OS and software interfaces as much as possible from end-users because the majority of Teleportal users are expected to be non-technical when it comes to Teleportal applications, and Microsoft has a proven record of delivering difficult products and interfaces (especially in their first generation or two after initial launch).

Microsoft's considerable negatives are offset by its lock-in of most customers, distributors and vendors into the Windows ecosystem. This market power drives considerations of including Windows 726, while the negatives drive consideration of also including other operating system options (such as utilizing Google's Chrome or Android architectures to provide an Internet-based interface that can hide the actual underlying operating system 726, or Apple's integrated ecosystem to enhance the user experience).

In addition, any influence should consider encouraging or requiring vendors whose products run only under Microsoft Windows to develop and release API's that enable their products to run on an operating system other than Windows, so customers who prefer other choices are not locked down.

Mobile-like 728: By 2008 there were over 3 billion mobile phone subscriptions, about half the human population. The mobile phone has become the world's most widespread communications device. That includes both advanced countries and numerous subscriptions in developing countries that do not have a large landline wired phone infrastructure, as well as in countries that have lower rates of Internet usage.

Today's mobile smart phone is more than a wireless voice telephone. It can provide expanding ranges of additional services such as text messaging, music playback, personal calendars, Internet access, software applications, e-mail, IM (Instant Messaging), games, still camera photography, video photography, watching streaming video and TV, MMS (Multimedia Messaging Service) for transmitting and receiving photographs and videos, and more.

The most distinctive features of mobile phone networks 728 include: (1) each cell phone is locked to one mobile carrier's network and is sold with a calling plan that locks in the customer to that one mobile vendor's services, and (2) calling plans provide only a bundle of usage with many other services charged on an à-la-carte (each use) or per service basis. This means each mobile carrier "monitors" its network and customers to track, meter and potentially charge every activity with every mobile phone. Some examples include charging for each text message sent, charging each time an already purchased game is played, etc. This is extremely effective financially because revenue from worldwide mobile data services (e.g., not voice calls) is starting to exceed revenue from fixed Internet access services (partly due to the fact that in some parts of the world mobile phones provide the only medium for any types of data services, including the Internet). This mobile phone financial model drives the business models and marketing of mobile service carriers, with two goals: First they seek increased market share to "own" the largest possible captive subscriber base. Second they seek to raise the usage of high-margin high-profit services such as text messaging.

As an operating system architecture for this Teleportal ecosystem, a mobile-like system 728 would monitor, meter and charge for every type of Teleportal use. If it paralleled the current mobile phone technical architecture 728, it would attempt to entice prospects to buy discounted Local Teleportals with some services on a monthly subscription plan. It would then market additional services that are likely to produce higher margins and profits for both the network provider and third-party vendors.

While the mobile industry has demonstrated that this yields attractive financial results, large numbers of subscribers and strong revenues, it does not generate high rates of usage of premium video such as video communications, sports, and online games. Where consumers have a choice and they can buy unlimited Internet access at a flat monthly fee customers choose to use the flat-fee Internet for various premium and video services. In some examples YouTube continues its growth among unlimited Internet users for videos watched and/or uploaded, in comparison with less video usage by many mobile phone users who have pay-as-you-go Internet data plans, or capped usage plans.

The technical operating system of mobile phone carriers 728 is driven by its business model of locking in a fixed base of customers then monetizing every use to compel maximum revenue attainable from every subscriber and every action that they take. Because mobile systems see flat rate data services as commoditization that destroys their role as toll-takers on various areas of human communications, a hybrid may be appropriate if a mobile carrier operating system model 728 is to be adopted for Teleportals, because they receive and transmit large volumes of data as their normal mode of operation.

API-like (any of the above plus modular API's that provide numerous options) 730: An API-like OS option 730 includes operating systems that are non-proprietary and based on open standards so that they include standardized hardware and programming interfaces, peripheral interconnections, and standards-based API's (Application Programming Interface) for various types of third-party hardware, \software, applications, data sources, etc. In addition, by employing standard API's Teleportal devices, servers and systems gain functions and procedures that can be utilized by the Teleportal operating system(s) or service(s) to support the inclusion of a wide range of hardware and software products, as well as standards-based interconnections between RTP's, LTP's and the TPN.

This option may include multiple OS's 720 722 724 726 728 730 so long as each is supported by sufficient standards-based API's so that the appropriate hardware and software may be incorporated in each device and system. Some examples of these OS's may include an open source OS for servers, a proprietary embedded OS for RTP's and LTP's, as well as mainstream mass-market OS's.

Servers/storage/load balancing (6424): Turning now to FIG. 147 "Servers/Storage/Load Balancing (6424)" in some examples these TPU components may consist of any combination of physical or virtual devices, components, modules, systems, processes, methods, services, etc. at a single location or at multiple locations, wherein any location or communication network(s) includes any of various hardware, software, communication, security or other components; in one or a plurality of data centers; in some examples as a distributed global network: in some examples by utilizing virtualized distributed server farms and storage farms located "in the cloud"; in some examples by means of multiple services in an SOA (Service Oriented Architecture); in some examples by means of a WOA (Web Oriented Architecture); etc. to accomplish the desired results as herein illustrated. In some examples the TPU 732 contains physical servers and resources that may be accessed by means of the Internet 734 and/or other data networks 734 including: Web servers 738 to provide portals, websites and other means for using the Internet or other networks to access RTPs 133 in FIG. 8, LTPs 132/MTP's 132, AID/AODs 134 and various types of Teleportal Networks 50 64 52 53 55 57 58 60 62 in FIG. 3, or to provide access to these from third-parties 758. Communication servers 742 to provide communication services or access to third-party services 758 such as Teleportal Shared Space(s) and Teleportal Broadcasts, along with communication-related components of Other Teleportal Networks, Virtual Teleportals, or Entertainments/RealWorld Entertainments. Applications/Network Services Servers 746 to provide applications or access to applications and 6412 in FIG. 135 from the Teleportal Network or from third-parties 758 along with network services or access to network services 6418. Teleportal broadcasts 6412 and Teleportal Shared Space(s) 6412 are some examples of the TPU 6400 in FIG. 135 from the Teleportal Network or from third-parties 758. Media storage servers 750 to provide storage for recorded and archived video including Teleportal broadcasts, along with streaming playback of video on demand, or access to archived video playback on demand from third-parties 758. Database servers 754 to provide database storage for TPU data such as for metered events database 6494 in FIG. 137 or 618 in FIG. 138, or for Teleportal Network Services 6418 in FIG. 135, TPU Business Systems, 6414, Teleportal Applications 6412, Teleportal Broadcasts 6412, etc.

In some examples said physical or virtual Teleportal servers and server farms 738 742 746 750 754 are accessed over the Internet or another data network(s) 734 by router(s) 736 740 744 748 752 that include and provide load balancing, or by a combination of networking devices such as routers plus separate load balancing devices. Load balancing is the process of spreading work to optimize the utilization of resources, response time or throughput, such as between servers, systems, applications, network links, storage or other resources.

In some examples said TPU 732 may be integrated with one or a plurality of third-party networks, applications, storage or communication servers 758, which are also accessed by means of the Internet 734 or another data network(s) 734 by means of router(s) 756 that may include and provide load balancing, or by a combination of networking devices such as routers plus separate load balancing devices. These third-parties 758 may provide independent Teleportal Networks, applications or services such as a Teleportal Network 52 in FIG. 3, Teleportal Broadcast Network 53, Teleportal Shared Space Network 55, other Teleportal Networks 58, various types of generic and specialized Virtual Teleportals 60 61, and Entertainments and/or RealWorld Entertainment 62. Said third-parties may also provide one or a plurality of components of the TPU 64 or 131 132 133 134 135 140 136 137 138 139 in FIG. 8.

Virtualization (6422): Architecturally, computers have been designed and organized based on the von Neumann architecture from 1946. As depicted in FIG. 148 a computer 760 loads stored software (and application 762) and separately stored data 764 into memory (RAM). It then uses a CPU 760 or 762 (if the application is running on a remote server) to execute the instructions in said application 762. This provides a general purpose computer where both the application(s) and its data may reside in memory together and be changed for a different application(s) and/or data as required. Said general purpose computer basically runs an individual application whether said architecture is contained within a local computer 760 or run across a network on a remote server 762 (utilizing an architecture such as a mainframe, client/server, web server, etc.).

In some examples applications on TPU 6400 in FIG. 135 include multiple devices in multiple locations that operate simultaneously and in an integrated manner to deliver the services expected by end-users—some examples of which might be called a meta-application that is run as an orchestrated process within which multiple individual applications and/or services are operated together. In some examples this works as a Teleportal Virtual Application is in FIG. 149. When Local Teleportal (LTP) 766 or Mobile Teleportal (MTP) 766 displays an image from Remote Teleportal (RTP) 781 this meta-application may include simultaneous applications and services such as: On the LTP 766 and/or MTP 766: An LTP or MTP loads and runs at a minimum a Web browser to locate that RTP 781 from a Teleportal Network service 778 or other source such as a Portal, an application 778, an applet 778, etc.

On the Teleportal Network: In some examples an LTP's request to observe a real-time scene from RTP 781 initiates a request for a Teleportal Session as represented in this figure as a general-purpose running of Virtualized Application X 768. Said session request is processed by the TPU Optimized Gateway (TPOG) 770 which authenticates and authorizes 772 the user and/or that LTP device 766 or MTP device 766, and applies the appropriate Teleportal Network policies 772 required for that session: That session is then provisioned 770 and said LTP 766 or MTP 766 is connected to the nearest available web server by means of Teleportal Virtualized Network Services 774. In some examples said Teleportal Web Server operates as a Teleportal Virtual Computing Resource 778 to run a web server or other application that provides navigation and access to locate and connect to the desired RTP 781, whereby the listing of accessible RTP's may be provided by a Teleportal Virtualized Service 780 from a stored list in Teleportal Virtualized Storage 776.

On the LTP 766 and/or MTP 766: In some examples when the RTP 781 is located the LTP's 766/MTP's 766 Virtualized Application X 768 may send a request to join the multicast stream from said RTP 781, or said join request may occur at multiple points on the TP Network, or be sent to the RTP 781 by said navigation means located on the Teleportal Network.

On the RTP 781: In some examples the multicast stream from this RTP 781 receives the join request from this authorized 772 and provisioned 770 Teleportal Session, which may occur on the TP Network or at the RTP 781, which includes said LTP 766 or MTP 766 as a receiver of this RTP's video/audio stream. In some examples said video/audio stream is processed by this RTP's 781 Local Processing Module and multicast by communications that runs on the RTP's 781 Communications Module.

On the LTP 766 and/or MTP 766: In some examples the LTP's 766/MTP's 766 Communications Module provides video/audio streaming data reception, and said video/audio data is processed by video software that runs on the LTP's 766/MTP's 766 Local Processing Module for display on the Teleportal's display(s) as configured by the end-user, and as positioned by the LTP's Superior Viewer Sensor (SVS) if said SVS is activated.

In some examples through virtualization a number of network and performance limitations are overcome such as requirements for direct connectivity to only one resource at a time on the network (such as provisioning based upon waiting to run an application by first waiting for network devices or connections and then waiting for a server to become available to run that application). In some examples other limitations are overcome such as silos of design/implementation/maintenance that are each unique and likely to be different from other similar functioning silos.

Turning now to FIG. 149 and FIG. 150, the TPU's Virtual Architecture is illustrated. Said architecture includes: In some examples TPU Virtualization FIG. 150 provides optimized orchestration at steps throughout a meta-application process so a TPU delivers available resources at the time of provisioning, with metering and dynamic improvements based upon latencies and other metrics during use. In some examples said TPU Virtualization provides this for input devices such as RTPs 783, LTPs 784, MTP's 784 and AIDs 786, as well as for output devices such as LTPs 784, MTP's 784 and AODs 786. In some examples this provides for a flexible and adaptive TPU that may assign available resources from the virtualized resources that includes Teleportal Virtualized Network Services 774, Teleportal Virtualized Computing 778, Teleportal Virtualized Services and 780, and Teleportal Virtualized Storage 776. Some advantages may include: Management may be simplified; resource use may be optimized; costs may be reduced; new applications may be designed and implemented based on resources and services available by means of the TPU, such as being able to add new types of applications and services without needing to buy new resources; new global communications, processing or storage capacity may be added by purchasing only a minimum of new resources, by making better use of existing or third-party resources that are accessible.

As depicted in FIG. 150, in some examples this integrates what could potentially be a diverse infrastructure by virtualizing it into a logical set of integrated components. In some examples resources may be assigned to various systems, capabilities, features and new applications as needed. Advantages include: Virtualized Teleportal Network 790: In some examples Teleportal networking resources are consolidated into a shared resource that may be dynamically assigned based on policy level differentiation FIG. 140 of customers, services (such as synchronous or asynchronous), devices (such as LTP's or AIDs/AOD's), subscriptions purchased (such as premium or basic), etc. Virtualized Teleportal Computing/Virtual Server Farms 792: In some examples Teleportal server and computing resources are consolidated in two virtual servers and virtual server farms that may be dynamically assigned to run Teleportal Applications or provide Teleportal Network Services as needed. As with other types of virtualization, this may use computing resources more efficiently, lower server costs, alter server management from separate applications to pooled computing resources (including design as well as management). It may also speed a Teleportal Network build out by enabling the use of standard servers in various clusters and configurations. Virtualized Teleportal Storage/Virtual Storage Farms 794: In some examples storage throughout the Teleportal Network may be treated as a shared resource that can be assigned dynamically as needed. Again as with other types of virtualization, this may use storage resources more efficiently, lower storage costs, reduce storage management from silos to a pooled resource, and speed the design and implementation of new Teleportal Applications. Metering Process/Metered Events Database 796: In some examples a virtualized TPU 782 788 790 792 794 consolidates data from applications and communications by including a feedback channel 686 in FIG. 142 that provides data such as events and delays to metering process 796 and a metered events database 796. Said metered data 796 may be employed dynamically to improve Teleportal Network performance, resource availability and optimized service delivery.

In some examples each incoming session or customer request(s) 782 783 784 786 within an existing session 782, virtualization of resources 787 allows automated selection of available networking resources 790, servers (including remote services and applications) 792, storage 794, etc., by means of algorithms that optimize each type of resource. Because the Teleportal Network processes, transports and manages large volumes of video, audio and data this is expected to be active and dynamic. As changes occur in network bandwidth 790, in server utilization 792, in storage capacity 794, etc., the metering process 796 provides data to automated virtual provisioning 788 for dynamically adjusting performance levels (if needed) to meet the service level(s) required for each class of session.

Access—Teleportal Utility (TPU) Optimization Gateway (TPOG; 6420): Turning now to FIG. 151, some examples illustrate users accessing the TPU 6305 by means of a TPU Optimized Gateway (TPOG) 6324. Said FIG. 151 describes some examples of a TPOG process 6305 6320 by which automated provisioning and automated dynamic performance adjustments are performed.

Initiating a Teleportal Session 6310: As illustrated previously in FIG. 137 in some examples a customer uses an LTP 6480, MTP 6480, RTP 6481, or AID/AOD 6482 to access said TPOG 6484 and 6324 in FIG. 151, which receives both initial access requests and after a session is established, receives requests for any additional TP services wanted 6310.

Authorizing and metering 6312: As previously described in some examples said requests 6310 are authenticated and authorized 6312 with that user's profile specifying items such as the class of differentiated service to provide based on that customer's subscription plan. The TP's configuration and policies for that level of service 6312 are acquired and the session or service is authorized and the metering service for that session is initiated 6312. Said process was previously illustrated in FIG. 137 including TPOG 6484 AAA server(s) 6486 and policy server(s) 6488.

Provisioning 6314: In some examples said authorized and metered session is provisioned 6314 and 6490 in FIG. 137 at the appropriate level of quality for its class of service.

Monitor/Dynamically Optimize/Report 6316: In some examples as said requested services are delivered 6498 in FIG. 137, metering process 6492 receives data such as events, devices, services, networks, identities, quality and publishes said data so that systems such as provisioning 6490 may monitor service quality and determine if said quality falls below minimum standards for said authorized session 6314 in FIG. 151. If quality is insufficient (as determined by metrics such as bandwidth allocated, maximum combined latencies, maximum number of packets dropped, etc.), deficiencies are corrected as possible to dynamically optimize said session 6316. Said metering process data 608 610 Remote Teleportals FIG. 138 is both published so that TP services and systems 600 may utilize said data, and said metering process data 610 is also written to metered events database 618 whereby systems such as provisioning 6490 may also monitor service quality, or other TP services and systems 600 614 616 may utilize said data.

Modify Policies/Modify Future Configurations 6318: In some examples based on the types and amounts of dynamic optimization required 6316, the TP's configuration and policies for said level of service may be automatically or manually modified 6318. Said modified policies and configurations 6318 are applied to future initial access requests 6310 and to new customer services requests during established sessions 6310. Note that in some examples of this TPOG process 6305 6320 for automated provisioning and automated dynamic performance, adjustments may be performed by differentiated classes of service. In some examples these have a range of options that may be configured based on known means such as:

Per customer: In some examples an individual customer may receive differentiated services based upon the plan, subscription, membership, etc. that is purchased, in some examples premium or basic.

Per session: In some examples if a customer purchases multiple different plans, then that customer may receive a different class of service for various types of sessions, such as basic for viewing RTP's (which may have high[er] tolerance for latency) and premium for Teleportal Shared Space(s) (which may have lower latency and be treated as a premium service).

Per application: In some examples applications such as RTP video/audio reception, Teleportal Shared Space(s), Teleportal Broadcasts, Virtual Teleportals, TP Remote Control, or RealWorld Entertainment may be managed as an individual application service(s). In some examples managed classes might be: Teleportal Shared Space(s) may be managed as a higher priority application class with dynamic improvements, as needed, to maintain either a higher level of two-way communication quality, or an assured level of quality if a SLA (Service Level Agreement) standard has been established. RTP, broadcast, etc. video/audio reception may be monitored as a standard application class and dynamically improved only if a set standard service level is not maintained. If a Teleportal is used for Internet web access and a customer has basic service, then this application class might be provided at the subscriber's SLA level (such as X megabits per second) but after that SLA is met this might be queued behind the other above classes, and improved only if sufficient unused bandwidth and TP Network resources are available.

Per queue: In some examples in case of severe network congestion with limited dynamic optimization resources and options, customers or applications may be auto-queued for dynamic optimization based upon various means such as their subscription plan (such as premium subscribers serviced first, then mid-level subscribers, and then basic subscribers), or application type (such as synchronous applications like Teleportal Shared Space(s) serviced before asynchronous applications like Internet browsing).

TPOG for alternative input and output devices (6420): Turning now to FIG. 152, Alternative Input Devices (AIDs) 6330 6340 and Alternative Output Devices (AODs) 6330 are customer endpoints like mobile phones 6332, networked video game consoles 6334, PCs 6338, laptops 6338 on Wi-Fi networks, "smart" televisions 6336 attached to a cable TV or satellite to network, etc. Because in some examples these AID's/AOD's 6330 6340 may enter the Teleportal Network through an external network connection they may not have the same level of optimized provisioning and dynamic service quality from the TPU Optimization Gateway. A typical AID/AOD session model may include (but may also be modified based upon the devices used and/or TP Network configuration):

In some examples the AIDs/AODs communicates with the TPN by means of their external network to request a service, third-party Teleportal Network or a TP application 6310 in FIG. 151 to which their user (a customer) is subscribed. Once this AID/AOD access request is received, the TP Network can provide authorized access 6312, TP Network policies that fit that authorized session 6312, optimized provisioning 6314 at that differentiated service level, monitoring of service quality 6316 by means of the metering process, and if needed modify TP Network policies 6318 and/or future configurations.

Using FIG. 137 in some examples the process for AID/AOD access, provisioning and optimization may be: Request access and service 6482 6484; Obtain AAA authorization 6486 and user (or device) profile 6486; Request policy 6488 and set the configuration for provisioning 6490; Provision 6490 and deliver the service 6498; Meter the session's and service's events 6492; Use dynamic optimization to modify said session's provisioning 6490 and services delivery 6498; Said metered events 6492 are also written to the metered events database 6494 so that metered data is available 6498 for the TPU and third-party services.

In some examples for AID/AOD access, the TPOG's automated service for optimized provisioning 6305 and dynamic service quality 6305 can be provided based on the parts of the Teleportal Network that are within the control of the TP Platform. Any steps, network use or "hops" outside the TP Network, such as those that use the AIDs/AODs external networks to access the TP Network and/or receive services from it, are not part of the TPOG's automated optimization service.

Teleportal network services (6418): The Teleportal Services Infrastructure (TPSI) is explained and illustrated by means of four figures: FIG. 153 "Teleportal Events Services Processes" provides an some examples of typical events for joining and expanding said TPU. FIG. 154 "Teleportal Services Bus/Hubs" illustrates the processes of services discovery, choreography, mediation and use. FIG. 155 "Teleportal Services Architecture" illustrates said Teleportal Services processes as an operating architecture that is illustrated by means of the most frequent events for using the TPU. FIG. 156 "Teleportal Services Improvements" illustrates the circular three-stage improvement process by means of which incremental, absolute and breakthrough improvements are produced in the TPSI.

In some examples the core component of the TPSI is the Teleportal Services Bus, and Teleportal Services Hubs (herein shortened to Teleportal Services Bus/Hubs, or TSBH). Teleportal Services Hubs enable small-scale or local implementations of said TPSI, while the Teleportal Services Bus supports the TPSI's large-scale growth. Both operate in a parallel way to manage diverse heterogeneous Teleportal Services from both inside the TPU and outside of it, as depicted below. Each Teleportal Service provides one or a plurality of capabilities that other services may use. Said Teleportal Services interact by means of a TSBH Gateway and the TSBH itself (see below). Location of each service: At the present time it is helpful to locate each service where user actions can be processed rapidly, but this requirement declines over time as bandwidth speed increases. In some examples Local Teleportal devices would typically provide shorter response times than servers and applications located on a Teleportal Network, until such time that TPN response times become rapid enough to reduce this sufficiently.

Teleportal events services processes (6418): Turning now to FIG. 153, some examples of processes for joining and expanding said TPU are illustrated. This figure shows the process by which Customers 800, Vendors/Partners aid the Teleportal Gateway 818 interact with Teleportal Services 822 by means of a Teleportal Services bus 872.

In some examples a Customer 802 (which may be an end-user or a business customer) or a Vendor 806 requests a service to join the TPU, or to aid it their membership. If a Customer 802, said request is by means of a Web browser to the TPU's Web entrance 820. If a Vendor 806, said request is by means of either a Web browser to the TPU's Web entrance 820, or direct service to service communications 808 812 816 by means of the Teleportal Services Bus 872.

Whether a Customer 802 or Vendor 806 in some examples the Services requested and provided may include business events such as: In some examples adding or editing includes business processes and services for add new, edit or update, delete, activate, disable, etc. as applied to customers 802, vendors 806, networks 810, applications 810, products 814, services 814 or devices 814. As shown by FIG. 154 below said Services 822 may be provided by the TPU itself 856 or external to the Platform from Partners 846 or third-party vendors 846. In Add Customer 802 (e.g. a new customer sets up a new account by means of a Web-based self-service application) by means of Teleportal Web Entrance 822, utilizes Customer System 824 and Accounting System 838 to create a new customer account. If said customer 802 knows which devices are part of the account then customer may (optionally) utilize Devices System 826. If said customer knows which vendors, networks, applications, products and/or services may be included then customer may (optionally) also utilize one or a plurality of Devices System 826, Vendor System 828, Network System 830, Products System 832, Services System 834, or Other Systems 842. Said customer entries are combined to create entries to a user profile. Said customer 802 may also utilize said Teleportal Web Entrance 822 and said Teleportal Services Systems 822 to edit, update, delete, activate, disable, etc. any element of said customer profile or account. In Add Vendor 806 (e.g. a new vendor joins the TPU and sets up a new account) this may be done by means of Teleportal Web Entrance 822 or by direct service to service communications 808 812 816 by means of the TSBH 872. In some examples said Vendor 806 utilizes Vendor System 828 and accounting system 838 to create a new vendor account. If said vendor 806 knows which networks 810, applications 810, products 814, services 814, and/or devices 814 are sold and/or delivered by means of the TPU, then vendor may (optionally) also utilize one or a plurality of Devices System(s) 826, Network System(s) 830, Products System(s) 832, Services System(s) 834, or Other System(s) 842. If said vendor 806 has customer accounts suitable for TPU use then said customer accounts may be entered by means of Teleportal Services Customer System(s) 824, Accounting System(s) 838, and/or other Teleportal Services System(s) 822 in order to create appropriate user profiles. In some examples said vendor 806 may also utilize said Teleportal Web Entrance 820 and said "service to service" communications 808 812 816 by means of TSBH 872 to edit, update, delete, activate, disable, etc. any element of said vendor profile or account, or add/update one or a plurality of that vendor's customer profiles or accounts.

Therefore, by means of said Teleportal Events Services Processes in FIG. 153, in some examples both new customers and new vendors may join the TP Platform, as well as vendors expanding the products or services they offer by means of said TP Platform, and customers signing up to use or buy a wider range of products or services from said vendors.

Teleportal services bus/hubs (TSBH) (6418): While typical business processes and Teleportal Services were illustrated in FIG. 153, turning now to FIG. 154 some examples illustrate TSBH (Teleportal Services Bus/Hubs) 858 868 880, the infrastructure components and processes that make small-scale and large-scale implementations of the TPU manageable as a diverse and heterogeneous environment. Said TSBH provides access to internal and external Teleportal Services Providers 850 870 that may be used by other internal and external Teleportal Services Requesters 848 860 (including customers and vendors). Said Teleportal Services Requesters 848 860 interact with Teleportal Services Providers 850 870 via said TSBH 858 868 880 by means of known SOA (Service-oriented Architecture) technologies. An SOA accesses available resources (independent services) in a standardized way by means of loose coupling. Therefore, modular distributed program components (services) may be designed, deployed and managed so that they are leveraged to collectively provide an application infrastructure that may be reused in multiple ways, which provides more flexible development and implementation of new Teleportal and business capabilities then a traditional monolithic application or enterprise system with hard-wired single points of contact. Said SOA, as a TPSI (Teleportal Services Infrastructure), is an architecture for the Teleportal's distributed communications and computing environment that allows it to include a plurality of different types of communications, computing, devices, technologies, and collective applications that may be flexibly designed, developed and deployed in both standard business processes and various types of new configurations.

Some examples of Teleportal Services interactions among Service Requesters 848 860, Service Providers 850 870 and TSBH (Teleportal Services Bus/Hubs) 858 868 880 are illustrated in FIG. 154. Service Requesters 848 and Service Providers 850 may be external 846 to the TPU and communicate with it by means of the Internet 852 and/or other networks 854. Service Requesters 860 and Service Providers 870 may be internal 856 to the TPU and communicate with each other by means of TPU Messaging FIG. 138 and TPU Data Sharing FIG. 137.

In some examples Service Requesters 848 862 864 866 find the appropriate Teleportal Services such as in one of three ways: In a large TPU 856 Service Requesters 848 860 communicate with a gateway 858 (the Teleportal Services Hubs Gateway). In a small to medium-sized TPU 856 Service Requesters 848 860 communicate directly with the Teleportal Services Bus/Hubs (TSBH) 868. In a start up to a small TPU 856 Service Requesters 848 860 may find Teleportal Services in a UDDI Service Directory.

In some examples a TPSBH Gateway 858 is useful for Service Requesters 848 and Service Providers 850 that are located outside the TPSI 856 and utilize the Internet or another external network for these communications. Said TPSBH Gateway 858 is also useful when disparate heterogeneous Service Requesters 848 860 and Service Providers 850 870 employ multiple protocols, and request TP Services to be exposed to external customers, vendors and partners across the Internet 852 and Other Networks 854. This enables accessing said TPU 856 because TP protocol translation services and functionality may be provided for, or embodied in, systems and technologies from a plurality of TPU sources. Therefore, said TPSBH Gateway 858 provides: TP Services 858 868 for enforcing security, identity, authentication and enabling access FIG. 137, followed by enabling appropriate Metering Service 6492 in FIG. 137, 610 in FIG. 138. TP Services for validating the formats of external and internal Service Requests 848 860, as well as Service Providers 850 870 where multiple protocols require support and/or transformation so that message formats are normalized between Service Requesters and Service Providers, such as may be provided in some example as a TP Service for Data Service 620 FIG. 138. Utilize a consistent TP Services namespace which is represented in FIG. 154 by TSBH Names/Addresses 878 and/or TP Services Directory 882 to map and route requests between Service Requesters and Service Providers. When in a startup or small to medium size TPU 856 the functions of TPSBH Gateway 858 may be integrated in the Teleportal Services Bus/Hub (TSBH) 868, providing a single TP Gateway and Bus/Hub 858 868. Regardless of the size of said TPU 856, Service Requesters 848 862 864 866 may obtain the appropriate TSBH Services names and addresses from a database 878 of said names and addresses, which in a TPU start up may be a routing table, or in a large TPU 856 may be a dynamic database automatically updated by the periodic self-publishing of Teleportal Services descriptions 850 872 874 876 to a TSBH Names/Addresses database 878 and/or a TP Services Directory 882. Service Requesters 848 862 864 866 utilize said TSBH Name and Address 878 information to retrieve Teleportal Services descriptions from the Teleportal Services Directory 882 or directly from the appropriate Teleportal Services Provider(s) 850 872 874 876. Said Teleportal Services Directory 882 may be a dynamic database automatically updated by the periodic self-publishing of Teleportal Services descriptions 850 872 874 876 to said Teleportal Services Directory database 882. The TPSBH Gateway 858 provides the appropriate TP Gateway Services for requests, which may be fewer or more TP Services for one message exchange then for another, based on which TP Service is requested 850 872 874 876, who each Service Requester is 846 862 864 866, protocol differences, message contents or other factors. The TP Gateway Services provided are determined by mediation 868 in which a mediation is a function that is reusable for Service Requesters 848 860 and Service Providers 850 870. Each said mediation function 868 is invoked as required.

Depending upon the size and design of the gateway 858 to the Teleportal Services Bus/Hubs, in some examples said database of TSBH Names/Addresses 878 and said Teleportal Services Directory (or Registry) database 882 may be developed and provided as one or a plurality of databases, as fits the TPU's size, scale, heterogeneity and distribution of simultaneous Teleportal Services. In some examples in a start up or small TPU 856 said TPSBH Gateway 858 and said TSBH Names/Addresses 878 and TP Services Directory 882 may be integrated as part of one TSBH 868. In the full TPU implementation 856, after the detailed Teleportal Service Provider description 878 882 have been retrieved at said Gateway 858, the TSBH 868 and Teleportal Services Orchestration/Choreography 880 provides: In some examples Orchestration and Choreography 880 provide known processes, controls and coordination for processes that span multiple services (multiple Service Requesters 848 860 and Service Providers 850 870). In brief, Choreography is the high-level process between multiple services while Orchestration is the low-level process within each individual service. Choreography 880 provides the high-level processes such as message exchange protocols so that the interactions between multiple services functions smoothly. Orchestration 880 is the process within each service (such as Service Provider 850 872 874 876) so that its execution and invocation are coordinated with the workflow required for multiple services to work together.

In some examples within the TPU 856 different TP Products and Services require different patterns of invocations and different levels of complexity. In some examples larger and more public activities that include multiple services benefit from Choreography 882 to compose or model the flow of services and protocols. In some examples said TPSBH 858 868 monitors inbound requests, messages or events to route them to each's appropriate recipient—an interaction. The TPSBH Choreography 880 represents the process of said interactions. In some examples TPU 856 users (which may be individuals at home or at work, vendors, business partners, etc.) use TP applications such as LTP's where those uses have costs that are billed to that user. A chargeable business process results from the Choreography 880 of TP Services 850 870 that authorizes said user for uses that incur said costs, performs requested LTP uses, monitors events within said uses, and provides accounting to said user's account. In some examples said TP Services 850 870 are the components within said TPSBH Choreography 880 that performs the integrated LTP uses and accounting business processes. Similarly in that same instantiation, the actions of the individual TP Services 850 870 are Orchestrated 880—that is, Orchestration defines the way each TP Service functions as needed within that business process. In some examples this enables changing the way a business process functions at the Orchestration level, so that business processes may be redefined to allow the TPU 856 to change its operation, or to simultaneously operate in multiple ways to fit the businesses of multiple vendors. The Orchestration(s) builds the flows that control the interactions between services. Within that same instantiation, in some examples Orchestration 880 is to manage parallel invocations of user sign on, authentication, security, accounting and provisioning to fit said user's request(s) for each LTP use; including possible termination due to events such as failure to authenticate, or a request to authorize an accounting charge because the requested service is outside of said user's subscription plan.

In some examples Orchestration 880 is to manage the long-running stateful LTP use itself, wherein the Orchestrated process waits for the next TPU 856 event, which may be ending that LTP use, or a change within that use. In some examples Orchestration 880 is to manage multiple simultaneous LTP uses such as (1) viewing several RTPs (Remote Teleportals) at once, (2) using a Teleportal Shared Space at the same time, and (3) collaboratively sharing one or a plurality of RTP views during that Teleportal Shared Space.

In the TPU 856 Orchestrations 880, said Orchestrations (as in some examples above and below) may fit one shared set of TP Services for invoking and delivering TPU video and audio across said Teleportal Networks to and from individual LTP's. At the same time, with multiple vendors providing services to the same LTP user, said Orchestrations may fit the separate and different business processes of each different vendor. In some examples RTP video and audio may be provided by Vendor 1 and paid for by the user under Vendor 1's Subscription Plan, while Teleportal Shared Spaces may be provided by a Vendor 2 and paid for by the user under Vendor 2's Subscription Plan. At the same time, the TPU 856 invokes its own TP Services 870 to deliver the actual video between multiple RTP's and the LTP, as well as to deliver the Shared Space(s) audio and video between two LTP's. Said TP Services Orchestrations 880 builds the flows that control the interactions between these different TP Services, even though these span and integrate multiple vendors, organizations and domains that are External 846 to the TPU, and are Internal 856 to the TPU, and are connected by means of the Internet to 852 or Other Networks 854.

Teleportal Utility services architecture and improvements (6418): FIG. 155 "Teleportal Services Architecture" illustrates some examples of said TPU's Services Infrastructure as a reusable and improvable operating architecture. In some examples said improvement process is illustrated in FIG. 156 and operates by means of a circular three-stage process: Teleportal Processes Designs (TPD) 934: Said high-level objectives are instantiated in low-level processes such as using LTP's to observe RTP's, using Teleportal Shared Space(s), making Teleportal Broadcasts, attaching Virtual Teleportals to Alternative Input/Output Devices, etc. These and other Teleportal Processes may be designed, modeled, simulated, documented and stored for broad access and reuse by designers of components of the TPU, third-party vendors, partners, and others. Teleportal Processes Automations (TPA) 936: Said TPD's are built as TP Services Choreographies/Orchestrations 880 and Services Provided 850 870 in FIG. 154, as described above. Said Teleportal Process Automations are built, tested, integrated, customized (if needed to fit a vendor or partner) and deployed. TPA's may be called as reusable services within TP Choreographies and Orchestrations. Teleportal Processes Management (TPM) 938: Said automated Teleportal Processes are performed (by the TPU 856), monitored, their performance automatically analyzed and optimized, and improved by means of TPM.

In some examples as a circular process these three stages include continuous improvements in TPD's (Teleportal Processes Designs) 934, the actual built TPA's (Teleportal Processes Automations) 936 and TPM (Teleportal Processes Management) 938 that may produce and deliver higher levels of reuse and services as more vendors and customers employ said Teleportal technologies, including: Incremental improvements (some examples are reducing latency, clarifying navigation between RTPs, etc.). Absolute improvements: Some examples add an entire new kind of network to the TPU, such as alerts from mobile devices (phones, pads, tablets, PDAs, laptops, etc.) based upon political assaults by dictatorial governments, so when government violence begins those who protect human rights receive notification to connect, while automatic recording are made of government violence against citizens so that these may be rebroadcast as needed, such as on one or a plurality of broadcast networks.

Turning now to FIG. 155, a Teleportal Services Architecture (TSA) provides some examples of an infrastructure composed of shared heterogeneous resources from multiple vendors that are presented as integrated, reusable services for dynamic allocation and use by customers, vendors and others as a TPU. This section describes the layers and operation of said TSA so that said TP Services can be designed, automated, deployed and managed as described in FIG. 156. This layered structure supports process and services decompositions at each layer so that additional processes and services can be inserted without needing to rework the parent layers. New processes and services may be added either as wholly new loosely coupled processes and services, or as new sub-processes or sub-services. In some examples a new type of business process and related service(s) such as a new type of Customer Order may be added. In some examples a new type of AID/AOD device such as a new type of hybrid PDA/mini-Laptop may be added.

In some examples the top TSA layer 884 includes the users 885 (such as customers, vendors, partners and other users). As described in FIG. 135 major market segments 6440 may include groups such as: Corporate/government 6442; Consumer/home 6444; Mobile/wireless 6446; Non-profit/education 6448; Other 6450.

Similarly, in some examples the top TSA layer 884 includes devices 889 that may connect to the TPU. As described in FIG. 8 major devices may include equipment such as: Local Teleportals (LTPs) 132; Mobile Teleportals (MTPs) 132; Remote Teleportals (RTPs) 133; Alternative Input Devices (AIDs) 134; Alternative Output Devices (AODs) 134. Said users 885 and devices 889 employ the TPU by the visible means of its presentation, user experience, user interface and interface components 884 that provide access to the Teleportal Services Architecture FIG. 155. In some examples a second TSA layer is the TPOG Gateway, AAA, TP policies, TP provisioning, metering, and optimizing 886 which were described in FIGS. 151 and 152 above, along with FIGS. 141 and 142. Layer 886 enables uses of the TPU some of which include: Teleportals 888; Teleportal Shared Space(s) 890; Teleportal broadcasts 892; Virtual Teleportals 894; Entertainments and/or Real World Entertainments 896. Other Teleportal Networks and applications 898 includes means for vendors and partners to form business relationships and enter new products and services for sale by the TPU. Other Teleportal Networks and applications 898 also includes means for TP customers to create and introduce access to additional services (such as web services), or to create said new services along with access to them, so that other customers may add them by means of interface components 884, which connect to said services. In some examples the next TSA layer is TP Services Choreography/Orchestration 900, which was described in FIG. 154 above. In some examples the next TSA layer is the TPSBH (Teleportal Services Bus/Hubs) 902, which was described in FIG. 154 above. Two of the TPSBH's various TP Services are illustrated in this layer 902: TP Session Services (TPSS) 904: Depending on each use requested by customers and vendors, said TPSS may include more or fewer TP Services as determined by each use's Choreography 900 or Orchestration 900. In a typical use, said TPSS 904 may include: Session management 906; Identity Management 908 (users/devices where users may include customers, vendors, partners or others); Customer/vendor profile management 910; Networks/services registries 912.

TP Accounting Services (TPAS) 916: Depending on each use requested by customers and vendors, in some examples said TPAS may include more or fewer TP Services as determined by each use's Choreography 900 or Orchestration 900. In a typical use by a customer, said TPAS 916 may include a use session (TPSS; TP Session Services) 904 that produces metered events/metered events database/TP data services 932, with said TPA Messaging 932 providing metered events data to TPAS Services 916 such as: Ordering 918; Accounting/account management 920; Billing/invoicing 922; Payment 924. In some examples the TSA's bottom layer, Virtualized TPU 922, includes the components and operations described in FIG. 149 "Teleportal Virtual Applications" and FIG. 150 "Virtual Architecture TPU". In FIG. 155, said components include: Virtualized provisioning/optimizing 924; Virtualized networking 926; Virtualized computing 928; Virtualized storage 930. In some examples each of these communicates with the Teleportal Metering Process as described in 610 in FIG. 138 "Teleportal Utility Messaging", and in 6492 in FIG. 137 "Share Data and Services."

Some examples of a service—One TP Sign-on (6418): Within said TSA FIG. 155 in some examples a service 902 is illustrated, namely a One TP Sign-on Service FIG. 157 that provides a unified sign-on for varied activities of TP customers for one or a plurality of Sessions 904 even though said customer may use a plurality of TP devices 884, TP networks 898, TP applications 898, other TP uses 888 890 892 894 896, and/or TP services 914 from a variety of vendors. Instead of said customer being required to sign-on to the TP Platform separately each time a new device, third-party vendor's network or application, and/or TP service is used, one seamless access means is provided. This fits users' needs to operate worldwide 902 as if they were present there 902, with a single common interface to a plurality of types of communications 886 888 890 892 894 896 898 and a plurality of applications 902 914 from a plurality of devices 884. This One TP Sign-on Service supports TP devices 884 and TP uses 886 even if they are fundamentally different from each other, or even if each is personalized by combining multiple devices and applications such as running a Virtual Teleportal 894 to view a Remote Teleportal 888 on a mobile "smart phone" 884.

Turning now to FIG. 157, in some examples said One TP Sign-on Service includes users 9640, the TP Network 9641 and third-party vendors and partners 9642. For the users 9640, TP network 9641 and third-party vendors 9642 said single sign-on is more efficient for managing user authorizations, profiles and lower administrative costs. Said One TP Sign-on Service begins with the expectations of users 9640 of RTPs 9630, LTPs 9631, MTP's 9631, and/or AIDs/AODs 9632 who, ideally, might prefer to sign on once to have access to TP communications from multiple devices, networks and applications from multiple vendors. Said user devices 9630 9631 9632 also include the common TP interface that is presented across multiple devices, or if not available, a familiar web browser which may be used to access said common TP interface.

In some examples the One TP Sign-on Service 9633 provides said unified sign-on by receiving or intercepting usage requests from a user 9630 9631 9632 or device 9630 9631 9632, then accessing and employing data storage of user data 9634 to authenticate and authorize said user's usage, and establishing a credential for said user. Said credential is automatically passed to the TP service 9635, TP application 9635, Virtual TP 9636 or Remote Control TP if said usage is on a device 9630 9631 9632 or on the TP Network 9641. If said usage is from a third-party vendor or partner 9642, then said credential is automatically passed to the security service 9637 of said third-party for authentication and authorization by means that each vendor determines is appropriate, such as by utilizing its own data storage 9638 for its own authentication process 9637. Once authorized appropriately by said third-party security service 9637, said credential is passed to the third-party's service(s) 9639, network(s) 9639 and/or application(s) 9639.

In some examples after that when said same user 9640 starts to access other uses from any of said user's devices 9630 9631 9632 or applications, the One TP Sign-on Service 9633 passes said user's credential to those services, networks or applications 9635 9636 9641. Said credential may be stored at the device 9630 9631 9632 if device or its TP usage software has the capability for said storage, and communicated by said device 9630 9631 9632 during usage requests. As a result users 9640 are able to access their TP uses on the TP network 9641 or from third parties 9642. The main risk is the virtualized centralization of the One TP Sign-on Service 9120, data storage 9634 of user data/authentication/profiles, third-party security services 9637 and third-party data storage 9638—because a critical failure of any of these components could cause a failure of related dependent services, networks and applications 9635 9636 9641. As a result said components should maintain both availability and redundant backup that may be utilized for "failover" or rapid automated recovery in case of failure. It is this same virtualized centralization, however, that produces simpler usage for users, easier administration for the TP Network and third-parties, and lower costs for the development of various applications and networks (e.g., they may employ said One TP Sign-on Service rather than developing and managing parallel and different security means repeatedly and independently).

In some examples the data required by the One TP Sign-on Service 9633 may vary depending on the security model adopted by both the TP Network 9641 and by Third-party Vendors/Partners 9642, and may include data such as: Identification of TP users 9640 and TP devices 9630 9631 9632. Dependencies such as what each uses from the TP services & applications 9635, Virtual Teleportals 9636 on which TP devices 9632, which Remote Control Teleportals 9636 on which TP devices 9632, and which Third-party Services, Networks and Applications 9639. Said data may also include which operations, workflows or choreographies require said security credential 9633 9635 9636 9637 9639, and the step (s) at which said credential is employed.

In some examples said user data 9640 and devices data 9630 9631 9632 may include data such as: User Id and/or password (login information if needed) and attributes (such as if login data is stored and performed automatically); Device name, ID and/or password (login information if needed) and attributes (such as if login data is stored and performed automatically); Each device's platform, operating system, or other attributes; Description and/or category; Network address such as URL or IP address; Device port(s); Organization or company; Location(s); Default TP Network connection(s); Owner(s) and/or administrator(s); Authorized users (if a family, company, group, etc.); Subscription(s), services purchased, etc. (perhaps with the bandwidth required for each, if there are SLAs [Service Level Agreements].

In some examples said stored dependencies, operations, workflows and/or choreographies may include data that allows said security credential to be configured in the format or schema defined by each service or application 9635 9636 9639 so that it can utilize said credential accurately and efficiently.

In some examples each said credential should also store its own expiration date so that each subscription's, purchased service's and/or product's automated sign-on credential expires automatically at the appropriate date and time. When that occurs said credential may be renewed automatically 9633 9634 (if said purchase has already been renewed), or manually 9633 9634 (if said purchase has expired and needs to be renewed by the customer), or blocked 9633 9634 (if said purchase has expired and customer declines to renew it manually) by means of the One TP Sign-on Service 9633.

In the examples the disclosed TP Services may consist of any combination of sequences, components, modules, systems, processes, methods, etc. at a single location or at multiple locations; in some examples included or integrated into multiple devices, servers or other larger systems of devices; in some examples by means of one or more applications executed locally and/or remotely.

Teleportal devices management (6416): Turning now to FIG. 158, some examples of Teleportal Devices Management Service(s) 954 provides levels of remote management, updating and servicing of Teleportal Devices 940 942 944 948 950 952. In some examples managed devices include those employed by end-users (whether consumers or business customers) such as: LTP's (Local Teleportals) 944, MTP's (Mobile Teleportals) 944; and RTP's (Remote Teleportals) 940; In some examples managed devices may include components of the Teleportal Network 946 such as Network equipment such as: TPN (Teleportal Network) servers 948; TPN storage 952; TPN server farms 950 and storage farms 950.

Because Teleportal devices management is performed by TP Services 954, in some examples it is a reusable process that may be employed to keep end-users from needing to have their device(s) manually serviced, manually updated or manually refreshed by online and/or wireless means such as: The TPU: In some examples keeps TP devices updated, regardless of whether said updates include their firmware, operating system, applications, device services, bug fixes, etc. Third-party vendors of devices, independent networks, or services such as Teleportal Shared Space(s): In some examples keep their products up to date and functioning properly. Partners who sell devices, systems or applications software to third-party vendors or to the TPU: In some examples to provide updates and new features and capabilities as appropriate. Virtual "kill switch:" In some examples any of these (TPU, third-party vendors, partners, etc.) may also utilize a virtual "kill switch" to terminate the use or functions on a legitimately disallowed device, application, service, etc. In some examples if a customer fails to pay for one of a plurality of products or services run on a LTP, after sufficient notifications and warnings to said customer in default, said "kill switch" could disable use of that component until payment is received. Depending on each vendor's technical and business processes, said kill switch may reside in some examples at an access gateway, in some examples in a TPU server, in some examples in a third-party server, in some examples in a customer's device(s), etc.

Device management is a known technology with established vendors and products. In some examples said TP Devices Management Services (TPDMS) 954 is a reusable and orchestrated TP Services implementation that may be invoked as part of Teleportal Network Services 6418 in FIG. 135. Because a Teleportal Utility may operate for years, it may contain a growing percentage of legacy devices, systems, applications and equipment that could become partly or increasingly obsolete over time. Said TPDMS provides means to update, manage, provide new functions to, and control both older and newer devices on the TPU such as: In some examples update the firmware of an older model of LTP's. In some examples for subscribers to an entertainment network's services, update their music applications software to replace the music playback module and raise the audio quality of the music playback system. In some examples if a customer changes from one network vendor to another, change some of the network applications. In some examples if some TP Networks have separate and incompatible Instant Messaging (IM) systems, then said TPDMS may remove the old IM application after a customer leaves one network, and said TPDMS may install and configure the new Network's IM application after said customer starts on the new network and requests or authorizes its installation. As the Teleportal Network grows a plurality of mobile and fixed devices may be attached to a TP Network. To maintain service quality in some examples these devices' local components may need to be managed and updated. Each individual device may need multiple separate TPDMS updates for their very different uses such as in some examples viewing RTP's, in some examples SPLS's, in some examples running Virtual Teleportals, etc.

In some examples said TPDMS 954 is a two-way TP Service. If local devices are capable of it, then in some examples a TPDMS may access, retrieve, display and store information about the current operating status, configuration(s), diagnostics, operating alarms, etc. of devices on the network: In some examples these data may be aggregated across a plurality of devices using TP Services, TP Applications and/or Business Intelligence to display current device status across the Teleportal Network using such known means as dashboards, monitoring workstations, web portals, etc. In some examples said platform-wide data may be integrated with business processes so that each vendor may see its customers' data, to understand and be enabled to increase their uptime, service quality, and customer satisfaction. Said individual vendor's data may be used by said vendor to determine its product life cycles and plan targeted marketing by seeing which percentage of its customers' products are older and ready for upgrading or replacement. In some examples for individual customers, that customer's devices may be displayed on one or a plurality of their devices so that each customer may be informed of the status of their Teleportal devices to assure them of its performance, determine if an online update is required, keep a device(s) properly serviced and updated at reduced costs and with higher profit margins, etc.

In some examples said TPDMS 954 uses the TPU infrastructure such as Teleportal Services Architecture FIG. 155, protocol transformations between different types of devices and TP Services FIG. 154, along with resources provided by Teleportal virtualized networking 790 in FIG. 150, virtualized computing 792, and virtualized storage 794.

New TP devices discovery: In some examples when a new TP device is connected to a network and turned on, it may send a trigger that initiates the process of recognizing it, configuring it and installing it on the appropriate Teleportal Network(s). In some examples once installed it may interact with in some examples other TP devices, in some examples components of the TP Network, or in some examples AIDs/AODs based on the subscriptions and purchases made by the user of said device. In some examples a TPU is an integrated system that permits a plurality of third-parties to provide in some examples modules, in some examples components, in some examples services, etc. of said process, such as device manufacturers who sell products, TP Network vendors who sell subscriptions or services, the Teleportal Utility itself, etc. Because of new technology and device evolution in some examples this process of "new TP devices discovery and installation" includes capabilities for continuous learning and self-improvement.

At a high level, FIG. 159 illustrates the discovery of new Teleportal customer devices. in some examples after a customer purchases a device such in some examples an RTP 956, in some examples an LTP 960, or in some examples an MTP 960 a first option is for a customer to connect it to a network such as the Internet, at which time the device may send a trigger signal received by the TPU 962 which in some examples responds and initiates a New Teleportal Customer Devices Orchestration FIG. 160 and/or in some examples New Teleportal Devices Configuration FIG. 161. Alternatively, in some examples a customer may use a Web browser to go to a Teleportal web site to either open an account, or to add the new device 956 960 to an existing account.

In some examples loosely coupled TP Services enable the use of appropriate means for each brand, type and model of device 956 958 960—which may differ from the means employed on the TP Platform 962. In some examples said devices 956 958 960 may operate outside any TP Network, and may utilize the Internet or another communication vendor's network for at least a portion of its route (such as with a device connected over a cellular network).

In some examples this process begins when a new TP device is connected to a network and (whether automatically or by end-user initiation), becomes online and sends a trigger to a pre-specified recipient(s). At the receiving end, in some examples the appropriate TP Service is also online and “listening” for said trigger (e.g., said TP Service can be idle or waiting in a loop for said request from said new TP device). As described elsewhere in this Teleportal Utility, in some examples said new Teleportal customer devices 956 958 960 enter said TPU 962 at the TPOG Gateway which provides various types of entry 968 and parts of session control 968. In some examples said new TP devices are in some examples recognized, in some examples configured, in some examples installed and in some examples registered on the TP Network with the uses and permissions in that customer’s account, or as an anonymous user if permitted by that TP Network and/or vendor. In some examples once installed on the TP Network, Transport 970 is provided to said devices by TPU means in lower-level network and equipment layers described elsewhere. In some examples TP Services 966 are provided to said devices by TPU means in higher level services and applications layers described elsewhere, along with examples in said TPU. In some examples third-party Services 964 are provided to said devices by TPU means described elsewhere.

New TP devices installation: Turning now to FIG. 160 “New Teleportal Customer Devices Orchestrations,” some examples illustrate a plurality of different TP Services that are employed as appropriate for each new TP device, to in some examples discover, in some examples install, and in some examples configure each different type of device on the TP Network. The number and type of said TP Services 971 varies and responds dynamically to each said device 972 974 976, and what is needed to make its installation and use acceptably usable for its end-user(s). In contrast to a plurality of current technology-based devices, the TPU is designed as an integrated system to make the purchase and use of each new TP device more efficient and direct for a plurality of different types of uses, which may expand over time. As described and illustrated above, in some examples Teleportal Services Improvements Process FIG. 156 provides monitoring 1022 in FIG. 160 of quality and results delivered by one or more means contained in said New Teleportal Customer Devices Orchestrations 971, to enable long-term continuous quantitative or qualitative improvements such as ease of use, user satisfaction, etc.

In some examples when an RTP 972, an LTP 974 or an MTP 974 is connected to the Internet to or its network, it may send a service request trigger that is ultimately received through the TPOG Gateway by the Teleportals Device Recognition Service 978 994. As described in the LTP (Local Teleportal) description above, during set up customer may have the option of entering existing account and identity information 980 into said device 972 974. If said identity information has been entered 980, then the appropriate TP Services 994 996 998 proceeds to auto-discover 982 and auto-install 982 said device 972 974 on the TP Network as described in New Teleportal Devices Configuration FIG. 161. While this may be developed by means of a variety of similar processes, a plurality of TP Services 992 994 are described herein to illustrate various components of these processes:

Device Recognition Service 994: In addition to recognizing the device 994 including its brand, device type and model number by means of a TP Device Recognition Service 994, which was previously described.

Device Status Service 996: Device identification data from Device Recognition Service 994 is applied by TP Device Status Service 996 to analyze that device and determine the appropriate characteristics of its current operating configuration and status 996.

To illustrate how each service may be orchestrated dynamically, said Device Configuration Service 998 is explained in some detail both here and in New Teleportal Devices Configuration FIG. 161: In some examples said device status data from the Device Status Service 996 Is applied by the TP Device Configuration Service 998 to configure said device 972 974 on the TP Network 982. In some examples said configuration process starts by combining 1000 device identification data 994 and device status data 996. In some examples said combination of data 1000 is used to look up the appropriate latest configuration from a TP devices configurations database 1003, and use that to configure said device 1002. If said configuration 1002 is successful 1004, then in some examples said device 972 974 is registered 1005 as an authenticated device and user on the TP Network. In some examples said customer and device 972 974 are notified 1006 by a TP Notification Service that utilizes the type of notification appropriate to said customer’s profile, the event in each orchestration for which said customer is being notified 1006. In some examples if said device configuration 1002 has issues and is not completed successfully, then said Device Configuration Service 998 utilizes alternative strategies 1008 such as rolling back to a previous configuration from device configuration database 1003, or making other adjustments as may be determined by data from Device Status Service 996 which identified other potentially conflicting applications installed on said device 972 974. If the result of said issues adjustments 1008 is a successful device configuration 1004, then in some examples said device 972 974 is registered 1004 as an authenticated device and user on the TP Network. If on the other hand, errors remain 1010, then in some examples said errors data 1010 are passed to TP Automatic Customer Service Escalation Service 1012. In some examples if said escalation service 1012 succeeds in resolving said errors 1010 and configuring said device 1008 1004, then a record of said issue 1008, said error 1010, and said problem resolution 1012 is added to said device configuration database 1003 to be employed in the future if said same issue 1008 and error 1010 occurs again. In some examples if said device configuration errors 1010 1012 persist and device is not configured successfully 1004 and cannot be registered 1005 on the TP Network, then said customer and device are notified 1006 by a TP Notification Service that utilizes the type of notification 1006 appropriate to said customer’s profile (in some examples currently accessible devices and user’s preference order) and available types of communications, including information about the device, its problem and the recommended escalation step(s) for the customer to take.

When a customer’s device is discovered 982, configured 998, and installed on the TP Network 982, in some examples said customer has the opportunity to use said device to add a plurality of Teleportal uses 984: In some examples if customer chooses to add another service then the TP New Business Service 986 is invoked and said device is used to sign-up for the additional use or service. In some examples for as long as said customer wants to add another Teleportal use 984, this is a continuous loop wherein each time through this loop said customer may add another service 986. When customer has finished adding Teleportal uses, said device is ready to use 988. Alternatively, said customer may use a Teleportal web site, a Teleportal vendor web site or another means to subscribe or sign-up for other Teleportal uses. If that was done, then said customer’s Teleportal account lists said other Teleportal uses for which customer subscribed. Those may be (optionally) displayed for customer on said device’s screen for confirmation, or not displayed as appropriate for each business process.

In some examples a new device on the network may provide its intended functions directly, or (optionally) it may need a personalized start menu or page 988 to provide access to the uses to which that customer and device 972 974 are entitled by means of subscriptions and sign-ups 986. In some examples said personalized menu or start page may be constructed by means of one or more TP Services 1014 as appropriate for each customer and device. In some examples said TP Services 1014 receive notification from a new Teleportal device 988 and construct said personalized start page and download it to the new device 972 974. In some examples said TP Services that construct and download said personalized start page interface 1014 may include Common Interface Service 1016 (which conforms said new device 972 974 to the Teleportal's Common User Interface 212 in FIG. 3), Interface Personalization Service 1018 (which fits the items in said personalized start page 988 to said customer's Teleportal subscriptions Such As Teleportals, Teleportal Shared Space (s) and Teleportal News Networks), and/or Device-Based Interface Customization Service 1020 (which fits said Common User Interface to the device's screen such as a large LTP, a mobile phone, or a white-screen television.

In addition to displaying the personalized menu or start page 988 1014 on said new Teleportal device, in some examples the next step is to notify said customer 989, using said TP Notification Service (described above).

In some examples if said device 972 974 has not had identity information entered 980, then said device is still auto-discovered 990 by said Device Recognition Service 994. Said discovered device may be utilized to perform sign-ups 986 984 for a Teleportal subscription(s) and/or service(s), or these may be provided anonymously. In some examples after customer has a Teleportal account or anonymous Teleportal access, then said device may be configured 998, registered 1005, and installed on the TP Network 982.

New Teleportal devices configuration (6414): FIG. 161 "New Teleportal Devices Configuration: RTP, LTP, VTP/MTP, RCTP and Devices (6414)" illustrates that multiple types of automated and semi-automated configuration technologies exist and may be employed as generally described in FIG. 160 and elsewhere. This figure demonstrates that multiple existing and new automated configuration technologies may be employed and/or combined into new combinations in association with the processes described above. In some examples known technologies each fall short of providing a complete process, including technologies for device connection upon installation, automated configuration of newly installed device(s), automated distribution of policy configuration(s), and network architectures for global access to multiple resources.

Turning now to FIG. 161 a combination of systems and methods is disclosed for connecting and configuring RTPs, LTPs, VTPs, MTPs, and devices for access and use on one or a plurality of public or private networks. In some examples users may enter no information or minimal information (such as the user's name or ID, password, and [optionally] the type of connection such as VPN or a communication vendor's name) to be added and/or configured for use. These configuration methods are intended for adding users and/or devices in automated and/or simple ways. In some examples where this does not work, there is an option to perform advanced, detailed or other configurations—but this does not need to be included or required if an automated configuration succeeds. Said combination process begins with the device to be configured 9390 and the type(s) of configuration available such as: RTP's 9391, LTP's 9393, MTP's 9393: Direct use, remote control, administrator/customer self-service control, etc.; Devices 9394 (as described herein): During use of devices, administrator/customer self-service control, etc.; Etc. 9390

In some examples a first configuration stage includes connecting, user identification and (optional, if needed) communication configuration 9395. When said device goes online and attempts to connect 9396 978 994 in FIG. 160, if (optional) user identification is required a user identification form may be displayed 9396 on that device or it may be sent by the network to an AID/AOD. In the latter case 9396 this may be done if a device has been previously associated with a user, such as at the time of purchase (as described elsewhere). Using said form 9396 said user enters the minimal data needed 9397 such as a user ID and password, or (if available) specifies anonymous device access 9397 in which case no data might be entered or needed. If said user enters data 9397 then if said user and/or said identified device are located 9398 9399, said user's profile is retrieved 9399, said device is added to said user's profile 9399, and said configuration process continues (in some this is transmitted to the appropriate user profile database 9399 and/or vendor database 9399 which are updated with the received information). If said user specifies anonymous device access 9397 and this is available for said device 9399, then no user profile is retrieved 9398 9399, the process is checked to confirm that this is not an error 9400, and said configuration process continues. If it is an error, however, then advanced configuration or error handling 9403 may be invoked. Where said configuration process continues 9397, whether with an identified user 9397 or an anonymous connection 9397, said device 9390 9391 9392 9393 9394 and network connection are automatically configured 9401 by retrieving the appropriate connection configuration 9402 (which may be in the form of a stored template 9406 appropriate to a combination of device, vendor, service plan, subscription, user, etc.), as described elsewhere, or by any known or newly invented means. In some examples a configuration transfer tool 9401 may retrieve a device configuration file 9402 that is communicated to the device 9390 being configured. Said systems and methods automatically configure said device 9390 9391 9392 9393 9394 for communication with the network after entry of minimal and/or initial user information 9397, or after anonymity is requested 9397, with a process that appears to said user as acceptably simple.

In some examples after said first user and communication configuration stage is complete 9395 an automated configuration stage 9404 is performed. This may employ templates 9406 or other "canned" pre-stored patterns, models, categorized configurations, etc. 9406 that are selected and retrieved by a service template management module, method and/or system 9405 as is appropriate for each combination of user, device, vendor, applications, service plan, subscription, etc. Said service template management module 9405 notifies a service configuration module 9407 of the resulting selection 9406. Said service configuration module 9407 automatically configures said device, user profile (if an identified user) and network for appropriate uses corresponding to the selected service template 9406 and that user's plan(s), subscription(s), device capabilities, etc. Sources of said service templates 9406 may include one or a plurality of: Vendors of LTPs/RTPs; Vendors of devices; Providers and/or vendors of VTPs, MTPs, etc.; Retailers of any of the above, including retail stores, service businesses, integrators, sales agents, etc.; Etc. (for some examples see AKM FIGS. 262 and 264 and elsewhere)

In some examples said automated configuration stage 9404 9405 9406 9407 includes methods and systems for implementing service configurations that may automatically configure said device 9390 9391 9392 9393 9394, user profile 9399, vendor records 9399, etc. for a service configuration so that may be accessed and used to provide a range of appropriate services for said device 9390 and/or said user, while not including services that are not permitted. Again, said systems and methods perform said second automatic configuration stage after a user's entry of only minimal and/or initial user information 9397, or after anonymity is requested 9397, with a process that appears to said user as acceptably simple.

In some examples after the first user and communication configuration stage 9395, and after the second automated configuration stage 9404 are complete, a third stage is performed in which some examples distribute said configuration (s) to enable direct and/or virtual access 9408 by said configured device(s) 9390. Users, devices, vendors, services, applications, etc. may be located worldwide 9414 so there needs to be mechanism(s) by which they can be found and accessed, and these include both means enumerated, any other known means to accomplish this, and new means that may be invented in the future. In some examples said configuration 9395 9404 is disseminated to provide access 9409 such as permitting or denying uses, routing within and/or between various networks, regions, users, devices, etc. A notification message 9409 is generated so that said configuration 9395 9404 may be added and/or modified in an index, pointer, etc. 9410 9411 (herein called a "Locator"), and there may be two or a plurality of Locators available 9411 9412. Each Locator 9411 9412 may provide a unique set of varied services such as gateway services, location services, authorization services, and/or other services as may be included or removed from each Locator from time to time. Said notification message may include configuration attributes such that configured devices 9390 receive appropriate access to appropriate communications, services, applications, etc. The first distribution of said configuration notification 9409 9410 is received and stored appropriately 9411 by a first Locator, which enables it to provide its services as described by the received configuration 9395 9404. In some examples the first Locator may generate or add to an index, pointers, "map", etc. that includes said received configuration data so that at least one component of said configuration is employed to provide appropriate services to said device and/or user. The first Locator 9411 then transmits or distributes the notification message to a second Locator 9412, thereby enabling the second Locator to provide its services as described by the received configuration 9395 9404, and said transmission and/or distribution 9411 9412 may be achieved by means such as replication, messaging, updating, or any other known means. After receipt said second Locator 9412 may generate or add to an index, pointers, "map", etc. that includes said received configuration data so that at least one component of said configuration is employed to provide appropriate services to said device and/or user. Thereafter, both the first Locator 9411 and second Locator 9412 may employ one or a plurality of dissemination techniques to dynamically update and/or configure a plurality of other Locators based on the receipt of configuration notifications, transmissions, database replications, etc. After propagation to multiple Locators 9411 9412 configuration data 9395 9404 associated with a device 9390 and/or user profile 9399 may identify a device, user, permitted services, etc. combination for which access is available.

In some examples when the device 9390 9391 9392 9393 9394 starts communicating 9413, and/or starts a new or different type of request during use 9413, it may contact a Locator 9416 9417 for appropriate access as defined in its configuration 9395 9404 and retrieve a single resource available 9414 and/or a list of resources available for that need 9414, then access them 9413 9414. Alternatively, if said device 9390 9391 9392 9393 9394 has already stored the location needed 9414 and received authentication and authorization (as described elsewhere), it may directly access and use said location(s) and resource(s) 9413 9418 9414 without employing a Locator 9411 9412. Also, if said device 9390 9391 9392 9393 9394 acquires the location needed 9414 such as from a search engine, a link from another source, etc., and received authentication and authorization (as described elsewhere), it may directly access and use said location(s) and resource(s) 9413 9418 9414 without employing a Locator 9411 9412. Some examples of these resources may include RTPs, LTPs, TP Shared Space(s), communications vendors, communications networks, broadcasts, applications, social networks, other specialized types of networks, entertainments, services, vendors, etc. Said resources may be public 9414 and/or private 9415, and said private resources may be protected by additional layers of security such as firewalls, required login, VPN accessibility only, corporate data network security systems, network security systems, etc. including any known or new security means.

In some examples this combination of configuration technologies FIGS. 160 and 161 allow a plurality of devices or customers to turn on, connect and configure new devices (such as LTPs, RTPs, MTPs, other devices, etc.) for use on one or a plurality of networks, with one or a plurality of resources, and have those configurations both generated automatically and propagated automatically to one or a plurality of indexes, pointers, etc. that may provide varying services such as access, locating resources, etc. (called "Locators"), as well as provide direct access to networks, services, resources, etc.

Teleportal Utility (TPU) business services (6414): The TPU Business Services (TPBS) are a useful layer 6414 FIG. 135 in the TPU because this enables its financial integration into a heterogeneous economy(ies) with various vendors and partners in a plurality of regions, economies and economic systems. These financial capabilities are explicitly designed for integration with multiple third-party vendors and partners to facilitate their business transactions with their customers and with the TPU, by means of the TPU's financial systems. While the overall TPBS is described and illustrated, the focus of some TPBS examples is the flow of revenues from Customers through the TPU to Vendors and Partners. In other words, said TP Platform works economically by providing systems, processes, methods, etc. such as billing, processing and distributing revenues to multiple vendors in some examples by means of a central platform; in some examples by means of a utility; in some examples by means of a network, etc.

Teleportal Utility business services—revenues view: Turning now to FIG. 162 "Teleportal Business Revenues," some examples are presented with the first two reflecting today's current economic systems. The similarities and differences are illustrated in FIG. 162, wherein the left Y axis 1072 of this figure is revenues that range from low at the bottom to high at the top. The bottom X axis 1074 is three economic strategies with the first two reflecting today's prevalent economic patterns: Commodity and Managed Services 1076: These are commonly sold as products and/or services such as Internet access from ISP's, simple mobile phones and wireless phone call services from Cellular Phone vendors, etc. In some examples these are often sold as basic subscriptions for a flat monthly price. They typically include provisioning (to get the service up and running), a minimum level of service quality, and customer support as needed. Differentiated Services (perhaps with an online store) 1078: These are commonly sold by single vendors who work to restrict access to their network and maximize their revenues, such as Cellular Phone vendors who permit network use only by a limited set of telephone models and service plans. These vendors than monitor network uses and charge for each use (as much as possible) to maximize the revenue they generate from every customer and/or network use. To provide additional services and revenue, some add an online store that sells additional applications from third-party vendors.

With the third option, Scalable Products & Services Ecosystem 1080 the TPU provides a hybrid for multi-vendor development of products and services, marketing and sales. This disaggregates and unbundles a typical single vendor's corporate offering. With this TP approach a multiplicity of companies may provide whatever parts of normal business services each chooses, while having the TPU provide the remaining portions. In practice this means the TP Platform is likely to provide a plurality of commodity-level services that save third-party vendors money and time, while each separate vendor(s) and partner(s) may provide a plurality of basic, premium and/or custom services as they choose (as well as any parts of the billing for said services). The goal of this economic and functional disaggregation is to enable customers to receive a plurality of types of differentiated and premium hardware, applications and services—while enabling a plurality of vendors to sell their offerings (whether generic, unique, premium, etc.) to customers. Since some costs, investment capital, business development and steps may be reduced or eliminated for vendors, they can focus on what they are bringing to market. With said increases in the ease of entering this market, vendors may streamline themselves opportunistically to capture generic and/or premium revenues from customers. They may also compete directly with the TPU. Thus, this hybrid allows a plurality of companies to enter market niches and maximize their potential revenues in potential ways (whether the niche supports in some examples small volumes at high prices, in some examples large volumes at low prices, in some examples large volumes at high prices, etc.). The ability to get into a plurality of markets may mean more firms may utilize the TPU to compete for more customers.

In some examples this Scalable Products & Services Ecosystem 1080 process described herein is not typical for multi-vendor platforms: Landline telephones: In some examples any type of compatible device or service can be attached to the phone network, but the telephone landline vendor does not share in the revenue earned by those compatible devices and services. Microsoft Windows PCs: In some examples is Microsoft Windows wherein any type of compatible software, hardware and/or network service can be attached to a Windows PC but Microsoft does not typically share in those vendors' revenues. The Internet: In some examples is the Internet wherein vendors of products and services receive their own revenues without needing to share them with the "Internet platform". Mobile phone communications: In some examples is mobile phone vendors who work to block the connection of devices from their networks except for those that they sell with an accompanying network usage plan that they also sell.

Several types of single-vendor scalable marketplaces exist, however, and some are quite large: In some examples is Apple's iTunes applications store wherein a plurality of software vendors write and sell software applications, add-ons and advertising for a number of hardware devices (such as the iPhone and iPad), and Apple receives a share of every payment (whether by a customer or by an advertiser). In some examples is Google's Ad Words wherein a plurality of vendors bid on keywords so their ads appear such as when a their keyword is searched using Google's online search service, and Google receives payment when an end-user clicks on one of these advertisements.

The TPU's new hybrid Scalable Products & Services Ecosystem 1080 disaggregates and unbundles a typical single vendor corporation so that each company may provide whatever parts of normal business services it chooses, while having the TPU provided the remaining portions. This is achieved by modularizing a normal company's business processes so that modules of services can be provided as individual distributed services or combinations of loosely coupled services to multiple vendors, partners and customers—who may employ those that save money and time, as well as increase their capabilities to deliver products and services. Since each company is independent, they can be competitive with each other as well as competing directly with the TPU, so this should remain legal and consistent with anti-monopoly laws, while the TPU as a whole provides varying amounts of competition with other global competitors—who are not excluded and may at any time introduce products and services within this Teleportal marketplace. This hybrid innovation is now illustrated and explained.

Teleportal Utility (TPU) business services—logical view: FIG. 163 "Teleportal Business Services Communications" provides some examples of a TP Data Sharing Environment (TPDSE) between the TPU 1024, Customers 1038, and some example Vendors/Partners 1048 1060 that are representative of a plurality of vendors, partners, affiliates, agents, etc. Together this illustrates how the TPDSE provides business data sharing between the TPU, Customers, and multiple companies in a manner that supports advancing technologies, products, services, business processes, anti-monopoly laws, and protection for individual customers.

In some examples said FIG. 163 integrates technology, data, applications and business processes into one consistent and aligned TPDSE to illustrate the information flows between each of these interrelated domains: Teleportal Utility 1024: While this 1024 includes Teleportal services a plurality of representative business services 1030 are listed including authentication/security, data services, event metering, accounting, new business, etc. with each service providing appropriate modules and services that are reusable as parts of multiple processes. In some examples reusable service, authentication/security services includes a login service for controlling logging in and security functions that prevent external and internal access that is unauthorized (and may include as a service or function any security technique known in some examples passwords, in some examples encryption, in some examples other security means, etc.). These 1030 and other TP Services access appropriate TP Databases 1026 1028 such as the Metered Events Database 1026 as well as other business databases 1028. Said data access is provided by TP data services that utilize networks and means described elsewhere.

In some examples TP Services 1030 may be provided outside the TP platform 1024 by means of a communications network (which may be the Internet or other networks and may consist of hardwired and/or wireless communications links), a TP Public Web Portal(s) or Website(s) 1032, a TP Business Web Portal(s) or Website(s) 1036, and by means of network connectivity to external customers, vendors, partners, etc. by means of TP Shared Services 1034 and TP Shared Data Services 1034. Said external accessibility is provided by networks and means described elsewhere such as in some examples FIG. 153 "Teleportal Events Services Processes". Said access processes may be utilized to provide quality indicators and measurements such as performance, latency, accuracy, business alignment, usability, and other metrics that may be either or both quantitative and qualitative.

Public/Customers 1038: In some examples end-users may utilize the TP Public Portal 1032 by means of an LTP 1044, MTP 1044, RTP 1046, AID 1040 1042, and AO 1040 1042. Physical TP devices such as LTP's 1044, MTP's 1044 and RTP's 1046 may also directly access TP Shared Services and Data 1034. Similarly, virtual TP's on AID's 1040 1042 and AODs 1040 1042 may also directly access TP Shared Services and Data Services 1034.

Multiple Vendors/Partners (herein illustrated by some examples 1048 1060): In some examples one or a plurality of vendors and/or partners may also interact with said TPDSE. Each vendor and partner 1048 1060 may design and operate its own business systems and processes by utilizing its own internal networks 1055 1067, applications 1052 1064, storage 1050 1066 and development resources 1056 1070. Each individual vendor or partner 1048 1060 has multiple ways to interact with said TPDSE: TP Shared Services/Share Data 1034: From vendors or partners, vendor services can interact directly with TP Services by means of applications 1052 1064 or from development systems 1056 1070. Similarly, devices at vendors or partners such as LTP's 1054 1062, MTP's 1054 1062 or other means (such as RTP's, AID's, AODs or virtual TP's) may also interact directly with TP Shared Services and Data Services 1034. TP Business Portal 1036: From vendors or partners, end-users may utilize PCs 1058 1068, development systems 1056 1070, LTP's 1054 1062, MTP's 1054 1062 or other means (such as RTP's, AID's, AODs or virtual TP's) to use a web interface to interact with the TP Business Portal 1036.

In some examples said TPDSE provides for each separate vendor, partner or other company to use or build its own separate business processes, technologies, architectures and systems—yet share data so that both TP Business Services and each separate company's business processes obtain the data they need to align their separate priorities and goals. It provides a common ecosystem structure, relationships, transport and services for data exchanges, messaging, discovery, mediation, choreography and orchestration such that the total sum of revenues paid by Customers and others are accounted for and paid properly to each participating company or business. A primary objective is to integrate said TP Business Services and processes so that they operate together in logical and unified ways.

Teleportal Utility business services—architecture view: FIGS. 164 and 165 illustrates some examples of a Teleportal Business Services Architecture (herein TPBSA) with a focus on the primary flow of TP Platform revenues and monies. FIG. 164 is a high-level blueprint that defines some examples of TP Financial Business Services 1081 provided by a TPU. When said financial services are implemented, said TPBSA provides a business infrastructure that supports customers, vendors and partners as well as reusable capabilities and options for serving them interactively in multiple ways, as well as in new innovative reconfigurations in the future.

In some examples said TPBSA is comprised of a portfolio of core financial modules 1081 and sub-modules (i.e., each single-function sub-module is a TP Service) that may be implemented in a flexible manner including: Customer Billing 1086: A Customer Billing module 1086 processes data acquired and received from data services such as Customer Contracts 1082, other Customer Data 1082, Metered Transactions 1083 (from the current billing period), and new Customer Orders and Installations 1084. Said Customer Billing 1086 is further comprised of the processes and TP Services delineated in FIG. 165 below where detailed charges are invoiced to the customer, with invoices perhaps including detail down to the invoice line level. Receivables Accounting 1088: A Receivables Accounting module 1088 constitutes the monies the Teleportal Utility is owed and expects to receive from customers (or from other sources) from transactions such as the sale of Teleportal devices, subscriptions for Teleportal services, etc. In some examples Receivables sub-modules (i.e., TP Services) may include new order establishment, metered services charge establishment, receivable establishment, discrepancy resolution, payment submission, delinquency notification, delinquency collection, etc. Payables Accounting 1094: A Payables Accounting module 1094 constitutes amounts payable to those who have provided products or services to the TPU such as employees, suppliers, banks, taxes, etc. Assets Accounting 1098: If the TPU acquires substantial properties or fixed assets, an Assets Accounting module 1098 constitutes accounting for said acquisitions. This may include sub-modules such as asset record establishment, asset ownership establishment, acquisition accounting, property accounting, etc. Governance/Budgeting/Funds Management 1092: A Governance module 1092 may be a flexible set of sub-modules that includes TP Services employed in financial planning, budgeting, funds management, etc. so that the TP may project and plan for its expenses and revenues, to formulate a financial plan that may then be used to approve expenditures, fund business activities, and evaluate business results and performance. General Ledger 1096: A General Ledger module 1096 constitutes the accounting record that lists increases and decreases in the accounts of the business (the accounts contained in the financial statements) such as assets (current and fixed), liabilities, revenues, expenses, gains, losses, etc. Said General Ledger module 1096 interfaces with the other financial modules such as Receivables Accounting 1088, Payables Accounting 1094, Assets Accounting 1098, etc.

In some examples a new customer order 1084 is combined with said customer's metered transactions from the current billing period 1083, and said customer's contract data 1082 and other customer data 1082 to perform customer billing 1086 (described in more detail below 1087). Said Customer Billing 1086 generates an invoice which Receivables Accounting 1088 receives and enters. If said customer's invoice includes products and/or services from a third-party vendor or partner, the appropriate payment to said third-party is received by Payables Accounting 1094. Said Receivables 1088 and Payables 1094 transactions are received by the General Ledger module 1096 for constructing the appropriate financial statements for each accounting period (such as a month, quarter or fiscal year). Said previous modules (Receivables 1088, Payables 1094 and General Ledger 1096) interface with the Governance module 1092 for purposes of budgeting, funding business activities and assessing business results and performance.

Teleportal Utility business services—customer billing: Rather than provide workflows for every module in the TP Financial Business Services 1081 in FIG. 164, one module is illustrated and the remaining financial workflows are not specified to any extent greater than what are sufficient for understanding the underlying concepts so as not to distract from the examples. FIG. 165 "TP Business Services Customer Billing" illustrates some examples of a primary flow of revenues and payments through the Teleportal Business Services, billing customers 9010 to produce revenues 9028 from the TP Platform, and making payments from those revenues 9032 9034 to third-party Vendors and Partners. This includes requests from external third-party Vendors 9001, Partners 9001, Customers 9002 and other TP Services 9004. It also includes obtaining data 9011 and providing it to said external requesters 9018 and services 9018, as well as making payments to third-party Vendors and Partners 9034. In similar processes other TP Business Services 1088 1090 1092 1094 1096 1098 and collectively 1081 in FIG. 164 may receive requests from these and other requesters, and interact with them as is appropriate for the nature of each type of request.

Some examples, as depicted in FIG. 164, Customer Billing 1086 is further comprised of the more detailed processes delineated in 9000 FIG. 165. Said process 9000 includes: Users of Customer Billing 9000: These include: Third-party vendors and partners 9001 who enter the Customer Billing module 9000 via TP Services; Customers 9002 who enter the Customer Billing module 9000 by means of a Public Portal or by means of a Teleportal device (such as an LTP, and RTP, and AID, or an AOD); Other TP Services 9004 who enter the Customer Billing module 9000 by means of the TSBH (Teleportal Services Bus/Hubs) 858 868 880 in FIG. 154.

Security/Authentication/Authorization/Logging Service 9005: In some examples upon receiving any request 9001 9002 9004 that requires personal, financial or other confidential or proprietary information, the first services invoked 9005 are authentication and authorization 9006 to insure that each request is valid. If not authenticated 9008: Said request 9001 9002 9004 is responded to as not authenticated or invalid. Retry if not authenticated 9008: Said request may have "N tries" to login and gain access before being blocked or locked out, usually temporarily. Fall-back if not authenticated 9008: Said request may be given an opportunity to retry said request, or to employ a secondary or tertiary means to obtain access, such as by having a password emailed to them. Authentication failure 9008: If authentication fails respond promptly, as well as notify by other means such as TP Notification Service that utilizes the type of notification(s) appropriate to said customer's or vendor's profile (as described elsewhere). In some examples 989 1006 in FIG. 160). If authenticated, then authorize 9006: For the request made, confirm that said requester is authorized to make said request. If not authorized then respond with the same pattern as for authentication issues (retry 9008, fall-back 9008, or failure 9008). If requester is authorized for said request then continue with logging 9007 and billing workflow 9010. Logging if authenticated and authorized 9007: Authentication and authorization should trigger a Logging Service 9007 that records the activity(ies) such as data queries, data flows between services, the data accessed, customer interactions with or edits of their data, with date/time markers for said activities. Said logs 9007 should be secure, tamper-resistant and auditable to foster trust among participants and stakeholders by adding transparency for oversight by appropriate managers and stakeholders, as well as insure compliance with relevant processes and policies. A data service that retrieves said logs 9007 should be designed to demonstrate interactively that authorized access complies with applicable laws, and to identify and surface violations. Said activity logs 9007 should be hardened to be tamper-resistant which may be accomplished by means such as encryption, secure physical facility storage, strictly limited accessibility, and personal authorization or auditing of anyone who directly accesses and uses said logs. Said logging service 9007 is part of making the TPU's Scalable Products & Services Ecosystem 1080 in FIG. 162 work, since this disaggregation of corporate economic activity is a departure from a normal single-business system firm.

Perform billing workflows 9010: In some examples after authentication and authorization 9006 complete successfully and logging 9007 is initiated, billing workflows are performed. Because of privacy and confidentiality of the information, transmission(s) that include private and/or confidential data 9011 9018 9021 9022 9024 9026 9028 should employ secure communications. In some examples a customer 9002 may use a website for a self-service invoice review, in which case a Customer(s) Lookup Service is invoked 9010, data is requested 9011 from appropriate databases 9012 9014 9016 and the customer reviews his or her account online 9022. In some examples a vendor or partner's billing workflow may employ TP Shared Services 1034 in FIG. 163 to obtain their customers' data for their own billing process, in which case a Customer(s) Lookup Service is invoked 9010, data is requested 9011 from appropriate databases 9012 9014 9016 and the data is shared with said vendor 9018 to perform said vendor's independent customer billing process 9020. If discrepancies occur they are passed to Exception Handling Services 9026 such as a Credit Card Expired Service 9026 (which notifies a customer if a credit card is expiring, and provides instructions for updating the credit card using a website). In some examples a third-party vendor or partner may employ the TP Platform's billing to invoice their customers and collect the revenues from their customers. In this case the vendor's Billing Workflow Services 9001 invokes the TPU's monthly billing cycle 9010 which utilizes said TP databases 9011 for customer data 9012, metered and billable transactions from the current billing period 9014, and other required data 9016 to prepare and send customer invoices 9024 on behalf of the third-party vendor. If discrepancies occur they are handled as described above 9026. In some examples TP Services 9004 invokes the TPU's monthly billing cycle 9010 which utilizes said TP databases 9011 for customer data 9012, metered and billable transactions from the current billing period 9014, and other required data 9016 to prepare and send customer invoices 9024. If discrepancies occur they are handled as described above 9026.

Share billing data with Receivables Accounting 9030: In some examples a process in billing workflows 9010 is to update customer accounts records in receivables accounting 9030, whose underlying workflow verifies each customer's account in receivables accounting 9030, and if valid then updates and stores the new invoice based on said customer's current billing 9010 and invoicing 9024.

Accept payments/Payments gateway 9028: In some examples after receiving invoices 9024 Customers may review their account(s) online 9022 or make payments 9028. Payments may be in the form of credit card, debit card, direct transfer from bank account, other payment services such as PayPal or other online means, physical bank checks that arrive through the mail, etc. Make payments 9032 to third-party vendors and partners 9034: If a third-party vendor or partner employs the TP Platform's billing 9010 to invoice their customers 9024 and collect the revenues from their customers 9028, then said customers' accounts are updated in receivables accounting 9030 for both amounts due 9010 9024 and amounts paid 9028. If corrections are needed then they may be performed manually or by an appropriate TP Service (s) 9031. Based on revenues received from said customers' payments 9028, those combined amounts are received in each third-party vendor's account by payables accounting 9032, and that total amount is paid periodically to said vendor 9034.

MULTIPLE IDENTITIES/LIVES (HORIZONTAL LIFE EXPANSION): In truth, a human life is too short—we die after too few decades. Life extension is wanted by many (such as extending one's lifetime to centuries of living well), but genetically and medically out of reach for those alive today. Many billions of dollars are spent annually on extending life spans by means of medical science, genetic research, public health improvements, pharmaceutical drug use, surgeries, hospitalization, assisted living, etc. Surprisingly, an Alternate Reality may "extend" life within our current life spans much sooner than medical life extension by enabling people to enjoy living multiple lives at one time, thereby expanding our "life time" in parallel rather than longitudinally. In brief, we can each live the equivalent of more lives within our limited years by having multiple identities, even if we are not able to increase the number of years we are alive.

Thus, one of the new fields of this Alternate Reality is "Multiple Identities" that impart life extension by means of life expansion—by endowing us with multiple simultaneous lives, rather than restricting one lifetime to only one life.

Furthermore, multiple identities may permit raising one's standard of living by multiple identities engaging in economic activities that may earn income, own assets and/or build wealth, providing more earning power than the current single physical identity with one job. Such additional wealth could enable an individual's multiple identities to expand the ways they enjoy life by each having a separate and/or different lifestyle(s), relationship(s), residence(s), living standard (s), etc. As a result that person might eventually choose to live the most in the identity and lifestyle that is preferred the most.

At the same time, the owner of multiple identities may designate each identity public, private or secret—and these may provide greater freedom and personal latitude to explore a wider range of life's opportunities and adventures. In some examples different public identities may allow different activities, businesses and personas to be tried, developed and matured. In some examples a private identity may allow a person to enjoy activities that are perfectly legal but different from that person's usual lifestyle. In some examples a secret identity may permit a person to try once in a lifetime experiences that may transform that person and allow him or her to enjoy completely different experiences from what he or she would otherwise be.

In some examples in the Alternate Reality multiple governances may develop independent of nation state governments. Some of those governances may be WorldISMs that are based on extremely orthodox and rigid belief systems. Since membership in a governance is nonexclusive a person may be a member of several different types of governances at one time, those who are members of an extremely restrictive WorldISM may also have a private or secret identity(ies) that allow them to experience, explore or enjoy other belief systems besides that of their WorldISM. These multiple private and/or secret identities may provide opportunities for lives or personal growth that would not exist in a single identity community controlled by a rigid belief system.

Multiple identities are not intended to produce new levels of anarchy or lawlessness, since society's legal framework and laws remain what each society and government chooses for itself. In some examples for tax reporting purposes each multiple identity may be required to share their owner's one government identifier such as a Social Security Number (SSN), or alternatively, each identity may be given a separate government identity such as its own SSN or tax ID number (such as each legal entity receives, such as a personal trust or a small corporation owned by one person). In some examples each private or secret identity may (optionally) be required to be clearly linked back to a person's real identity to protect against law breaking, fraud, and other damaging behaviors—and to conduct investigations, serve subpoenas or make arrests if needed. In some examples a person's private or secret identities might be accessible online by legal authorities (such as a subpoena). Thus, society's macro framework (e.g., nation state governments with its local system of laws) remains in control with its accepted laws and regulations, while the levels of the individual and/or "governances" may gain greater freedom and "self-control" by having a access to multiple identities.

Current uses of identities: Turning Now to FIG. 166 "Current Use of Identities," it can be seen that individuals already have the pre-cursor to multiple identities. As this figure illustrates, the one individual "John Smith" may have a dozen or more separate identifications that are each the way that one system, service, or entity knows and stores his individual data, which is often personalized for or by that individual user. In some examples the following are merely a representative sample of the varied identifications that a plurality of people already possess: Owner's Name 9420: These identifications belong to the one owner, "John Smith."; Type 9421: People currently have multiple types of identifications such as work, personal, professional, travel, blogs, etc.; Entity 9422: Within each "type" a person may have multiple identifications such as work (various networks, systems, applications, etc.), personal (various types of personal relationships such as e-mail addresses, college alumni associations, professional associations, social networks, blogs, etc.), commerce (various types of commercial relationships such as online shopping such as Amazon.com, corporate relationships such as a tech support account from a hardware or software vendor, etc.); Financial/Assets: Various types of financial accounts and assets such as bank accounts, brokerage accounts, etc.

User ID 9423: For each relationship the entity assigns a separate identification that typically includes a user ID and password. For this one user ("John Smith") the range of user IDs may be wide or narrow depending on how the user decides to manage them. In some examples there are similarities and differences such as JBSmith, JBSmith2, John_Smith, cruiser99@yahoo.com, dunkshot42, JBSmith1357, goaway57, John_Smith321, Smith_JB1357, JBSmith579, etc.

Password 9424: Similarly for each user ID (or identity) the issuing entity requires a password, which produces the common problem of being required to manage too many "identifications" (User ID's, passwords, profiles, etc.) to enable easy use of all one's sites and services that require logging in.

Since a plurality of these identifications may include unique user profiles with various amounts and types of personal data, and there is typically no requirement for these to be truthful or accurate (except for some types such as financial accounts), these identifications may be considered precursors in which a plurality of people have created identifications that in some ways resemble establishing multiple separate identities.

Multiple identities by identity service(s), identity server(s), etc: FIG. 167 "Multiple Identities by Identity Service(s), Identity Server(s), Etc." provides a high-level summary of multiple identities. In some examples one process is initiated when the owner of the multiple identities 9436 uses a device such as an LTP 9428, MTP 9428, an RTP 9426, an AID/AOD 9427, or a device 9429 that involves a use by an identity, such as Identity 2 ("Name 2") 9438. When a network or service is accessed 9430, such as the TPU 9430, a gateway 9431 accesses an identity service(s) 9433 and/or an identity server (s) 9433 using means that are described herein. Said identity service(s) 9433 and/or an identity server(s) 9433 in turn utilize an identity database 9434 to retrieve, authenticate and authorize said identity (such as Identity 2 "Name 2" 9438). Similarly, if a user's device 9426 9427 9428 9429 is already connected to a network 9430, service 9430, TPU 9430, etc., it may then run an application that alters an identity's assets or affects a similarly secure and sensitive process (in some examples desiring to switch from one identity to a different identity). In these cases said identity service(s) 9433 and/or an identity server(s) 9433 are accessed for authorization 9432, and these in turn utilize an identity database 9434 to retrieve, authenticate and authorize said application or use 9432.

In any of these or other processes that involve identity(ies) 9436 and authorization to use said identity(ies), said identity database(s) 9434 provides secure storage and retrieval for said user's 9436 multiple identities 9437 9438 9439 which in this case includes one user's 9436 real name and multiple identities, each with an associated name: Identity 1/"Name 1" 9437; Identity 2/"Name 2" 9437; Identity N/"Name N" 9439. Each of these identities is in turn linked to a separate user profile for that identity 9440, as described in greater detail herein. Management of these multiple identities 9442 is provided by Identity Management tools, systems, methods, etc. 9447, which in various instantiations may be under user control 9443, one or more vendor(s) control 9444, one or more governance(s) control 9445, etc. 9446 as authorized to provide management of one or more of said user's 9436 multiple identities 9437 9438 9439 and/or associated profiles 9440.

Some examples of multiple identities: FIG. 168 "Example Multiple Identities" illustrates some examples of individuals (John S., Sam J. and Jill B.) 9450 who each have multiple identities. Though the various examples in FIG. 168 provide illustrative categories such as the user's real name 9450, each user's self-created groups of identities 9451, types of identities 9452, a name for each identity 9453, and a parallel set of contact data attributes for each identity 9454, the multiple identities are not limited to these categories or data attributes. On the contrary, since a range of identity service services and/or identity servers may be provided by various vendors and governances, TPU, etc.; these categories and data attributes may be more or less fixed or flexible as determined by each identity vendor, governance, TPU, etc.

In some examples one of these individuals is John S. who may have a total of seven types of identities 9452 in three self-created groups 9451 (Family, Career and Fun). These seven identities include:

Family: One public identity of a head-of-household breadwinner in a traditional nuclear family, a married father with a career and job.

Career: John's three career identities allow him to earn multiple incomes and thereby raise his earnings and enjoy multiple activities and lifestyles for his multiple identities. These include: Work: His everyday job and career, using his real name John Smith; His online business: Under the name Nelson Kennedy, he owns and runs an online business; His professional services as an online researcher: Under the name Hugh McCann, he offers professional research services online.

Fun: John's three fun identities provide him and his family multiple ways to enjoy life, including: Traveler: Under the name Kurt Bennett, John and his wife enjoy adventure trips to the world's most exotic cities and interesting destinations; Partying: Under the name Eric Scott, John and his wife enjoy more interesting lifestyles that are normal for some stages of life, but are uncommon during their current family-focused stage of life; Virtual: Under the avatar name Angelica, John explores various virtual worlds.

In some examples one of these individuals is Sam J. who may have three types of identities 9452 that are differentiated by levels of privacy, in one self-created group 9451 (Lives). These three identities include: Public—Personal/Work: One public identity provides Sam Jones with a completely normal persona in which he works and lives a typical, everyday life. Private—Personal: As Lance Yesman, he may enjoy anything legal that he wants, while keeping it separate from his public life. Secret—Secret: As Alan Allright, he occasionally enjoys trying one-time adventures that he might otherwise never attempt.

In some examples one of these individuals is Jill B. who may have four types of identities 9452 that are in two self-created groups 9451 (Earnings and Getaways). These include: Earnings: Jill is focused on wealth accumulation and upward mobility into a luxury lifestyle, so concentrates on three earnings-focused identities that provide her a way to become wealthier than just one identity and one job; Job: Jill's public life, job and career are done using her real name, Jill Brown; Business 1: Under the name Mary Mathews, she is co-owner of a local store, and her partner is the store's full-time manager; Business 2: Under the name Ted Hamil, she owns an online retail business that has multiple online stores, selling products from manufacturers who ship directly to the customers; her three part-time employees are a techie who keeps the stores running smoothly, a buyer who selects the merchandise, and a customer support person who answers questions from both customers and vendors; Getaways: Under the name Jenny Thomas, she owns an upscale beachfront condominium in a nearby coastal city. There she has started enjoying the luxury life she would like, and looks forward to converting to this identity and lifestyle full-time as she builds her wealth.

Each of these identities has an associated profile that includes a set of data attributes for each identity 9454, but this associated profile is not limited to these data attributes—they may be varied by any authorized identity owner, vendor, governance, TPU, etc., who provides identities and/or profiles. In some examples the data attributes associated with each identity include: First name; Middle name; Last name; Address 1; Address 2; City; State; ZIP code or postal code; Country; Home phone; Work phone; Cell phone; E-mail address(es); Government identifier 1 (such as a SSN [Social Security Number], which may be more appropriate if multiple identities are treated as a "person"); Government identifier 2 (such as a Tax ID Number, which may be more appropriate if multiple identities are treated as legal entities such as a corporation or a trust); GOID: Global Ownership Identifier (described elsewhere such as in some examples in FIG. 173) if Identity Registration Directory(ies) (IRDs) are used, and/or if Identity Registration Tool/Service (IRTS) are used; Biometric ID 1, Biometric ID 2, etc.; Identity goal 1, identity goal 2, etc.; Etc.

Some examples of interfaces using multiple identities management: While numerous interfaces are possible for managing a user's multiple identities (including APIs, widgets, servlets, clients, tools, applications, etc.), FIG. 169 "Example Interface User's Multiple Identities Management" provides some examples of interface designs that illustrates how it may be possible for one user to manage multiple identities 9456 9462 with each of their associated attributes 9464 9465 9466, assets 9457, financial accounts 9458, devices 9460, services 9459, and functional operations 9469 9470, etc. These types of interfaces may be utilized by multiple parties 9442 in FIG. 167 such as the identities' owner 9443, vendors 9444, governances 9445, etc. 9446 who each have identity management authorization 9447 over one or more of a user's 9436 multiple identities 9437 9438 9439 and/or one or more of those identities' associated profile 9440.

As illustrated in some examples of an interface in FIG. 169, a user's multiple identities are listed and selected under the Identities tab 9456 in a list such as hierarchical 9462 that includes said user's self-created groups (Family, Career, Fun) 9462, types of identities (Work, My Business, Researcher, Traveler, Partying, Virtual) 9462, and identity names (John Smith, Nelson Kennedy, Hugh McCann, Kurt Bennett, Eric Scott, Angelica) 9462. Said selection of an identity is performed and the identity selected may be highlighted in said list such as by background highlighting 9463 and font changes 9463. That same selection is also displayed at the top center of these interface examples as "Career>Work>John B. Smith".

The various attributes of said selected identity 9463 9464 may also be displayed on this area of this interface 9456, even if some of those are stored in an identity database(s) 9434 in FIG. 167 and some are stored in said identity's user profile(s) 9440. In some examples these attributes may include: The identity's level of privacy 9465 such as public, private, secret, etc.; along with means to change the identities privacy level 9465 such as the "Change Privacy" control. The identity's contact data 9466 such as its work title, address, phone, cell phone, e-mail, SSN (Social Security Number), birth date, etc.; along with means to edit and change said data such as "Add Phone" or "Add E-Mail Address"; along with means to display additional data such as the scrollbar 9467 on the right.

In addition, a wide range of this identity's other data may also be retrieved, accessed and be editable regardless of whether it is stored and retrieved from an identity database(s) 9434 in FIG. 167, from said identity's user profile(s) 9440, and/or from other sources such as financial accounts, device vendors, services, etc., such as: Assets 9457 and various types of properties (whether real estate, boats, vehicles, etc.); Financial accounts 9458 such as bank accounts, brokerage accounts, insurance accounts, health savings accounts, etc.; Services 9459 whether online or real world but occasionally accessed by electronic or digital means; Devices 9460 such as LTP, RTP, VTP, RCTP, TPSSN, TPBN, TPAN, AIDs/AODs, etc.; Etc. 9461

Also illustrated in some examples of interfaces are some possible functions that, in this case, include Total Assets (from all identities) 9469, Create Identity 9470, Delete Identity 9470, Group Assets (to provide access to one set of financial resources and properties from multiple identities) 9470, More (functions) 9470. The latter "More" lists 9470 may include items such as those covered in the Identity Applications layer of FIG. 170. In the examples the components may include any combination of components, modules, systems, processes, methods, services, etc. at a single location or at multiple locations; wherein any location or communication network(s) may provide economic functions and features, and this is not limited by these examples but may in fact include any economic functions that are known and practiced.

Abstracted architecture for identity service(s), identity server(s), etc.: Turning now to FIG. 170 "Abstracted Architecture for Identity Service(s), Identity Server(s), Etc." this illustrates this abstracted architecture for multiple identities, including varied implementations. As depicted, one architecture includes Access 9474 9475 with access that may be based on LDAP, HTTP, XML, SMTP, APIs, SSL (Secure Sockets Layer), Widget(s), Serviet(s), Client(s), Abstracted tool(s) or interface(s), Application(s), Vendor(s), Governance(s), etc. By means of said Access 9474 9475 the user receives multiple identity(ies) data provided by Identity Applications, Services, Servers, etc. 9476 9477; which is retrieved from Identity(ies) Storage, Database(s), User profile(s), etc. 9478 9479. When appropriate, encryption may be used to provide security during transmission and/or storage.

With this architecture 9474 9476 9478 both known and new types of Identity Management applications 9476 9477 are possible and these may include applications and/or features such as my identity(ies), create identity(ies), edit identity(ies), configure identity(ies), delete identity(ies), group identities, associate identities, share assets or ownership between identities, transfer assets or ownership between identities, switch or exchange identity(ies), sell identity(ies), privacy/secrecy settings for identity(ies), set presence awareness for identity(ies), search identities, create alerts by identity(ies), delete alerts by identity(ies), edit alerts by identity (ies), identity/profile publishing, "Fiduciary" use by identity (ies), etc. For some examples a plurality of these types of applications, functions and features are present in banking and/or brokerage applications, but others are novel. As described elsewhere, these Identity Management applications 9442 in FIG. 167 may be used to control one or more identities and each identity's accounts and/or assets by their user/owner 9443, one or a plurality of vendor(s) 9444, one or a plurality of governance(s) 9445, etc. 9446; with those levels of control set by Identity Management tools, systems, methods, etc. 9447.

With this architecture 9474 9476 9478 these types of access such as one comprising layers 9474 and 9476 provides a range of types of access to stored identity data 9478 9479 9480. Said stored identity data 9478 9479 9480 is a secure storage place(s) protected by a range of known security means 9462 such as a firewall(s), encryption(s), authentication(s), etc. Said security means 9462 may be employed at both the identity service(s)/identity server(s) layer 9476 9477, and at the identity storage layer 9478 9479; or alternatively said security means 9462 may be employed in varying types and amounts at each of these two layers individually. Since users own their respective multiple identity data 9479 9480, each user may determine access to their own data. The identity storage 9478 9479 9480 provides storage of and controlled access to the identity data. In this layer multiple identities storage may be stored using encryption, though alternate approaches to said secure storage may be used in other architectures or designs.

In some examples the Identity Service(s)/Identity Server (s) is defined as three layers as illustrated in FIG. 170, namely an access layer 9474, an identity applications/services/servers/etc. layer 9476, and an identity storage layer 9478. By way of the access layer 9474 9475, industry standard protocols and tools help provide access to the identity data, as well as custom tools that are developed for a variety of needs. By way of the applications/services/servers layer 9476 9477 multiple types of applications, features, functions, etc. may be provided and run on numerous devices, servers, clients, etc. such as: My identity(ies) 9477; Create identity(ies) 9477; Edit identity(ies) 9477; Configure identity(ies) 9477; Delete identity(ies) 9477; Register identity(ies) such as with an Identity Registration Directory 9477; Group identities 9477; Associate identities 9477; Share assets, accounts, properties, or other ownership between identities 9477; Transfer assets, accounts, properties, or other ownership between identities 9477; Exchange identity(ies) 9477; Sell identity(ies) 9477; Privacy settings for identity(ies) 9477; Presence awareness for identity(ies) 9477; Search identities 9477; Create/edit/delete alert(s) 9477; Identity/profile publishing 9477; "Fiduciary" use by identity(ies) 9477 (a "Fiduciary" is a service that may provide financial or other trust-related duties on behalf of another [currently such as a trustee, attorney, agent, etc.]) in some examples assisting in the transferor of accounts, funds, assets, or other property(ies) between one person's public identity and that person's private identity or secret identity so that there is no direct trail or connection between one identity and another. (This does not provide means for laundering or hiding money from proper disclosures to governments such as for tax payments [as described elsewhere], but does provide means for keeping assets private when owned by a private identity, or for keeping assets secret when owned by a secret identity.); Etc. 9477

By way of the storage and databases layer 9478 9479 one or a plurality of identity databases 9480 may be provided by one or a plurality of infrastructures or utilities (such as the TPU) and/or third-party vendors, and delivered by means of various devices, servers, clients, networks, etc. comprising components such as: Architecture 9481: File system(s), schema(s), APIs, backup/restore, etc.; Storage-level services 9481: Identity registration directory(ies) in which a user and his or her multiple identities, and (optionally) each identity's accounts, properties, assets, etc., are assigned a Global Ownership Identifier (GOLD) as described further herein; mapping multiple identities (and optionally some or much of what is owned) to a user; etc.; Audit services 9481: One or a plurality of audit "warehouses" that provide data storage for appropriate audit logging, activity logging, change logging, etc.; audits, audit data retrieval, etc.; Etc. 9481. In some examples the functions may not be grouped in layers, but instead may be constructed as modules; in some examples they may be constructed as other components; in some examples they may be constructed in other architectures. In some examples the access protocol 9475, stored data 9479 9480, and identity application 9477 may be combined in a single object. In some examples functionality may be distributed between client access 9477, protocols 9475, and identity storage 9479 9480 in various ways such as through Web widgets or servlets while still providing the multiple identities described herein. In some examples functionality may be distributed to third parties by means of APIs and/or third-party applications so that independent developers may provide additional identity services, edits/updates, applications, functions or features within various other applications or services, such as those provided by third-party vendors, Fiduciaries, governances, etc.

Set up and single sign-on for multiple identities and their services, devices, vendors, etc.: Turning now to FIG. 171, "Set up and/or Single-Sign-on for Multiple Identities and Their Services, Devices, Vendors, Etc.," in some examples an identity provider (such as the TPU or a third-party identity provider) is used to provide authentication and authorization services for multiple sign-ons, services, etc. with a single sign-on. Said identity provider communicates with one or more service providers. A user device and/or identity that wants to access a service provider (such as "Service A") is authenticated by means of the identity provider. The identity provider determines if the device and/or identity is authorized and provides the appropriate authentication, which may also include providing a certificate, pass key, cookie etc. for subsequent sign-ons by said device and identity. When said device and identity attempts to access a second service provider (such as "Service B") that is associated with the same identity provider, that second service may access the identity provider and said device's and identity's recent authentication may be determined and transmitted to the second service. Alternatively, the device and identity may transmit the identity provider's certificate, pass key, cookie, etc. to the second service provider to demonstrate authentication and authorization. In some examples the components may consist of any combination components, modules, systems, processes, methods, services, etc. at a single location or at multiple locations, wherein any location or communication network (s) includes any of various communication and security features.

In some examples an identity provider 9491 verifies an individual user's device(s) and/or identity(ies) for multiple services and/or service providers, such as throughout an infrastructure such as the TPU. In some examples a user 9484 is employing devices such as but not limited to an RTP 9485, an LTP 9487, an MTP 9487, an AID/AOD 9486, or another device that involves a use by one identity, such as Identity 2 ("Name 2") 9438 in FIG. 167. Using said device, said user attempts to access Service A 9488. Communication between said device(s) 9484 9485 9486 9487 and said service (Service A) 9488 and said identity provider 9491 may be by any combination and/or communication means such as wired or wireless, etc.

In some examples said device and identity may provide identity and sign-on information to the service provider (Service A) 9488 9489. Said service provider then provides said user's identity and sign-on information to the identity provider 9491. In an alternative, said service provider (Service A) 9488 9489 may display as part of its interface a component of the identity provider's interface 9491, so that said user may sign-on directly with said identity provider. In another alternative, said user's device and identity may sign-on directly with said identity provider 9491 to provide authentication and authorization to said user, device and identity. During any sign-on either the identity provider 9491 and/or the service provider 9488 9489 may request information from the user to authenticate and authorize said user and/or device. Some examples include mother's maiden name, date of birth, account number, SSN, etc. In addition, biometric data (such as a finger print scan) or other data (such as a smart card) may be requested. In any case, once said identity provider 9491 authorizes said user the relevant information is saved such that said user, device and/or identity is associated with a password, credential, pass key, unique information, biometric credential, etc. said authorization is then transmitted 9492 to the first service provider (Service A) 9490. If appropriate, said identity provider's authorization 9492 of said device and identity is also transmitted to said user's device 9493 9484 in the form of a certificate, pass key, cookie, etc. such that this authorization may be transmitted in future sign-ons.

In some examples after such an initial authorization 9491 and transmission 9492 to a first service provider 9490 and (if appropriate) to said user's device(s) 9493, a user can access that same first service provider without enduring a repeat of the initial sign-on process. As an alternative, said user might need to enter only a user ID and password when accessing said first service provider. During these subsequent sign-ons, said first service provider 9488 9489 may connect to identity provider 9491 during the user and identity's subsequent accesses, but said user may not be made aware of the communication between the first service provider and the identity provider. Such communication may indicate that said user's device(s) and/or identity(ies) have been verified; and if verified, said user may seemingly "automatically" access the first service provider without needing to sign-on. Said initial sign-on and authorization with the first service provider 9488 9489 9491 9492 9490, may be used by subsequent sign-ons to other service providers that are associated with the same identity provider 9491. This may be facilitated if the identity provider 9491 is able to transmit authorization 9492 9493 to said users device(s) 9484 9485 9486 9487 in a form such as a certificate, pass key, cookie, etc. that can then be transmitted by the device 9484 for subsequent sign-ons 9494 9495 9496 9497.

In addition this single sign-on authentication and authorization may be utilized in whole or in part even when different service providers require greater or lesser levels of authentication to provide access and services. In some examples a service that allows users to transfer funds between financial accounts may have a higher authentication standard than a social networking web site whose users primarily post messages and photographs. Thus, an identity provider may establish “levels” or “classes” of authentication wherein each “level” or “class” indicates the method(s) and information required to authenticate the user’s identity and/or device. Said authorization “level”, “class” or other information that indicates the security of said authorization may be included in said user’s stored authorization record(s) at the identity provider, and/or the user’s certificate, pass key, cookie, etc. that may be stored at said user’s device and transmitted by it during subsequent sign-ons by that identity. Said “level” or “class” may be used in whole or in part by a service provider. In some examples a service provider may consider one “level” or “class” acceptable for use. In some examples a service provider may consider that same “level” or “class” acceptable only for some uses, and require a higher level of authentication for more sensitive or secure uses. In some examples a service provider may consider that same “level” or “class” insufficient even for initial sign-on and require a higher level of authentication to grant access to its services.

In addition, a user may establish a relationship with said identity provider in which multiple identities, devices, services and other relationships are authenticated and authorized by various means by the identity provider. Some examples of interfaces such as FIG. 169 illustrate how one user/owner’s identities 9456, devices 9460, services 9459, etc. 9461 may be accessed and authenticated at one (or a small number of) session(s) by direct access with an identity provider 9491. Subsequent to that session (if successful) said identity provider may transmit authorization 9492 in the form of certificates 9493, pass keys 9493, cookies 9493, etc. 9493 to said user’s appropriate devices 9485 9486 9487 so that the appropriate multiple identities may enjoy sign-ons that are as simple as possible. Similarly, said identity provider may also store authorized records of said user/owner’s identities 9456, devices 9460, services 9459, etc. 9461 that may be accessed to provide future sign-ons where said user’s devices cannot store an issued certificate, pass key, cookie, etc.—in some examples during sign-on said identity provider would be able to pre-fill certain allowable fields (from stored data) in authorization forms to streamline said user’s multiple identity’s sign-ons.

Turning now to a user who has previously been authorized for a first service provider 9488 9489 9491 9492 9490, or has previously been authorized directly by an identity provider 9491 and had said authorization stored by said identity provider (whether for one device and identity or for multiple devices and multiple identities), or whose (one or a plurality of) device(s) 9484 9485 9486 9487 have previously received one or more certificates, pass keys, cookies, etc. 9493 to be employed during subsequent sign-ons, options are now available for subsequent sign-ons:

In some examples said user’s device(s) and one identity 9484 9485 9486 9487 may transmit something the user possesses 9493 (such as a stored certificate, pass key, cookie, etc.) as part of accessing and/or signing on to a subsequent service 9494 9495. Said authentication 9496 may then be acceptable to said subsequent service 9496 9497, which then may permit use of its service 9497 without needing to inform said user.

In some examples said user’s device(s) and one identity 9484 9485 9486 9487 may transmit something the user possesses 9493 (such as a stored certificate, pass key, cookie, etc.) as part of accessing and/or signing on to a subsequent service 9494 9495. Said authentication 9496 may then (optionally) be transmitted between said service and said identity provider 9491 for additional authentication and authorization of said credential(s) 9492 9497, for verification of its “level” or “class”, etc. without needing to inform said user unless there is a reason to require additional verification or authentication (such as the “level” or “class” is lower than needed for that type of services). In that case, only the additional parts of authentication may be needed rather than a complete re-authorization.

In some examples said user’s device(s) and one identity 9484 9485 9486 9487 do not possess anything to transmit 9493 (such as a stored certificate, pass key, cookie, etc.) as part of accessing and/or signing on to a subsequent service 9494 9495. In this case said user has previously established a relationship with said identity provider in which multiple identities, devices, services and other relationships were authenticated and authorized, and said authorizations are stored at said identity provider. When said subsequent service 9495 provides authorization means 9496 for said user and identity 9484, this may be accomplished by the user providing identity information and the subsequent service provider verifying the identity of the user with the identity provider 9491, and the identity provider transmitting the results of the authentication 94 92 to the service provider 9497 who may then permit access and use 9497. In this case, said identity provider 9491 receives a request for one or more of the user’s identities from the subsequent service 9496, and if there is a registered identity matching the request, then the identity provider retrieves and in verifies the identity information 9491 and transmits 9492 the appropriate verification, authorization, and if needed additional identity information to the requesting service 9497. In some examples the identity provider may transmit additional information 9492 9497 such as the “level” or “class” of authorization (or information such as the criteria used to authenticate the user). Access may then be provided in any manner specified above (such as in some examples if the “level” or “class” is lower than needed for that type of services, only the additional parts of authentication may be needed rather than a complete re-authorization).

With respect to any type of sign-on, should the user, device and/or identity fail to be properly authenticated or authorized by the identity provider, by a service provider, etc. (after contacting said user for additional authentication information), then such failure outcome may be transmitted to said identity provider, to said service provider, and/or to subsequent service provider(s) so that (1) said service provider may block said user from opening a session, (2) said identity provider may flag said user’s authorizations, (3) transmit that as an alert or message to one or more service providers, (4) require a higher level of authorization(s) in subsequent sign-ons until said sign-on failure(s) are corrected, or (5) take other security, corrective, etc. steps as deemed appropriate.

TPU gateway, authentication and authorization, and resource use by multiple identities: Turning now to FIG. 172 “TPU Gateway, Authentication and Authorization, and Resource Use by Multiple Identities,” in some examples a gateway filters requests and an provides single sign-on authorization by means of multiple authentication systems—which utilizes the services of multiple identity providers and/or multiple authentication and authorization systems; and upon use, one or a plurality of identities may be employed in using one or a plurality of resources. Said multiple identities process begins when a user 9500 uses a device such as an LTP 9504, an MTP 9504, an RTP 9501, an AID/AOD 9502, or a device 9503 that involves a use by one identity, such as Identity 2 ("Name 2") 9438 in FIG. 167. Said device and/or identity 9501 9502 9503 9504 makes a request which is received by a gateway 9506 9507. If the resource requested 9508 is not protected, then said request is passed to said unprotected resource 9509 for direct use. If the resource requested 9508 is protected, then the gateway passes said request to one of a plurality of authentication systems, servers, services, etc. 9511.

In some examples an authentication and authorization service(s) 9511 begins by receiving the device's identity information 9512 (as described elsewhere), and attempts to utilize said identity information to obtain authorization from one or a plurality of authentication systems 9513 (such as the identity provider illustrated in FIG. 171). After said authentication and authorization are completed successfully 9514 this is transmitted to the protected resource requested 9515 9522. In addition, the relevant user/identity/device/etc. information may be (optionally) saved such that said user, device and/or identity is associated with a user ID, password, credential, pass key, unique information, biometric credential, etc for future sign-ons and uses. Said authorization is transmitted 9515 to the requested resource 9522 9523, and may be (optionally) logged 9516. If appropriate, said identity provider's authorization 9515 9517 of said device and identity is also transmitted to said user's device 9517 9500 9501 9502 9503 9504 in the form of a certificate, pass key, cookie, etc. such that this authorization may be transmitted in future resource requests and/or sign-ons.

If sufficient identity information is not received 9520 then said user may be contacted for the additional information needed to provide authorization 9520. Some examples of additional information include mother's maiden name, date of birth, account number, SSN (Social Security Number), first school attended, first car owned, etc. In addition, biometric data (such as a finger print or other biometric identifier) or other data (such as a smart card) may be requested 9520. If sufficient information is not received, or if inaccurate information is received, or if authentication fails for another reason, then authorization fails 9514 and said authorization failure may be (optionally) logged 9518, and said user is denied access to the requested resource 9519. Optionally, additional failure or error correction actions may be performed 9519 (such as providing means to recover in the event said user forgot a password or a user ID).

In some examples of the use of said resource(s) 9522 the authorization is received directly from storage in said user's device 9500 9501 9502 9503 9504. In some examples of the use of said resource(s) 9522 the user's and/or identity's authorization is embedded in or attached to said resource request 9507. In some examples of the use of said resource(s) 9522 the user's and/or identity's authorization is received from authentication/authorization 9511 9515. After authorization is received 9523 a session is created under the authorized identity 9524; the resource monitors that identity for activity 9525; when said user acts as this identity 9526 the appropriate task, service, etc. is performed 9527; and when completed, the resource returns to monitoring that identity for activity 9525. If the user's device(s) 9500 9501 9502 9503 9504 does not support multiple sessions, then if the user chooses to switch to a second identity 9528 the first identity's session must be ended, but if the user decides not to switch identities 9528 and does not choose to end the first identity's session 9528 then the first identity's session is continued 9525. If, however, the user's device(s) 9500 9501 9502 9503 9504 supports multiple sessions, then said user may choose to open a new session by a second identity 9528. In this case, either the first identity's session may be ended or the first identity's session may be continued 9525. If the user's device (s) 9500 9501 9502 9503 9504 supports multiple sessions, then said user may choose to add a second identity's session 9528, or add a plurality of sessions by multiple identities 9528, whether or not any session(s) by another identity is ended.

In any case when a new identity is invoked to open a session 9528 or request a resource 9528, an authentication process is repeated for each new identity 9529 9511 and/or for each protected resource requested 9529 9511. If available for the new identity and/or device, a stored certificate, pass key, cookie, etc. 9530 may be employed for authentication and authorization 9511. Alternatively, as described herein, if said user/identity/device/etc. authentication and authorization has been registered and saved (such as with an identity provider) that said saved authorization may be associated with a user ID, password, credential, pass key, unique information, biometric credential, etc and may be employed for future sign-ons and uses. However performed, if authorization is successful 9531 a new session 9524 may be created under that new identity for that new resource, wherein the new resource monitors that new identity for activity 9525; when said user acts as this new identity 9526 the appropriate task, service, etc. is performed 9527; and when completed, the resource returns to monitoring that new identity for activity 9525. During the use of a device 9500 9501 9502 9503 9504 for multiple sessions by multiple identities, the user switches between the opened sessions 9524 9524 9524 (for a plurality of identities) to perform the appropriate task(s) 9526 9527 or to request the appropriate service(s) 9526 9527 under each separate identity. If, however, a new identity 9528 9529 or a request for a new protected resource 9528 9529 is not authenticated or authorized 9531 9511 then that failure may (optionally) be logged 9518, access to the requested resource may be denied 9519, and the appropriate failure or error actions may be performed 9519. The components of these processes may consist of any combination of components, modules, systems, processes, methods, services, etc. at a single location or at multiple locations, wherein any location or communication network(s) includes any of various hardware, software, communication, security or other features.

Multiple identities ownership of assets and property with authentication and auditing: As described in these multiple identities (such as in FIGS. 168, 169, etc.) each identity may own its own assets, accounts, properties, securities, businesses, and/or engage in any legal form of commerce, employment, investment, enterprise, etc. This requires allowing each user/owner to manage multiple identities that each own multiple assets in different financial institutions, government registries, etc. This solves the problem of identifying the "true" owner of a multiple identity by providing a common framework for one or a plurality of ownership registry(ies) that include mappings between a user and their various multiple identities that are part of the same user, even if their assets are held by or associated among multiple accounts, government property registries, etc. In addition, this provides assignments and mappings between user identities in different ownership registries. With this approach a single common ownership/identity registry is not required, nor does it change the current system of each individual choosing their own varied ways to hold assets in multiple accounts, institutions, etc. This recognizes a plurality of ways of holding assets in a plurality of environments, yet it provides means for correlating multiple user identities so the ownership of assets and properties may be correlated to the correct identity, and the correct multiple identities may be correlated to the correct single user. One advantage is these assignments and mappings can be expressed in tools and services that take the viewpoint of the user and his or her multiple identities, rather than from the view of each type of assets/properties/etc. with their owners as secondary.

Turning now to FIG. 173 "Multiple Identities Ownership of Assets and Property with Authentication and Auditing," means are provided for said multiple identity ownership, financial and business activities by the multiple identities of one person. This figure exemplifies identity mapping(s) and assignment(s) that includes a directory whose entry may include either or both multiple identities for a single user, and (optionally) assets, properties, accounts, businesses, etc. and identity mappings between an identity and those entries of its assets, properties, etc. This identity mapping(s) and assignment(s) mechanism includes correlating multiple user identities to one person, and (optionally) correlating each identity's assets to that person. By using various types of access 9474 9475 in FIG. 170 and applications 9476 9477 various tools and services can use the identity mapping mechanism (optionally with secure and/or protected access) for multiple purposes such as (1) determining if an identity is a unique person or a multiple identity, (2) determining which multiple identities are part of one unique person, (3) (optionally) determining if a multiple identity owns a specific asset, property, account, business, etc., (4) (optionally) determining the full range of assets and liabilities of one person including their multiple identities, (5) assisting in the management of a user's identities even if their assets reside in different environments (such as different accounts, countries, etc.), making their administration more efficient even in heterogeneous environments such as multiple financial institutions, financial systems, networks, countries, etc., (6) authenticating and authorizing multiple identities in any service or transaction when ownership is invoked, (7) etc.

In some examples a user and his or her multiple identity (ies) are registered 9534 by means of an Identity Registration Tool/Service (IRTS) 9535, and a plurality of the user's multiple identity(ies) are assigned to one Global Ownership Identifier (herein GOID) 9536. Some examples illustrate these by means of a sample user, Jill Brown's GOID (Global Ownership Identifier) 9546 who has multiple identities 9547 and those identities' ownership 9552 of accounts, properties, assets, etc. In both this Alternate Reality and in its Identity Registration Directory(ies) (herein IRD) 9537, each of Jill Brown's multiple identities 9547 and ownership 9552 are assigned her GOID and mapped between its individual identity "owner" and that identity's property, as follows: Jill Brown (Jill Brown's "job" identity) 9548: Jill Brown's accounts, properties, assets, etc. 9553 are assigned to her Jill Brown GOID and mapped to her "Jill Brown" identity. Mary Mathews (Jill Brown's "Business 1" identity) 9549: Mary Mathews' accounts, properties, assets, etc. 9554 are assigned to Jill Brown's GOID and mapped to her "Mary Mathews" identity. Ted Hamil (Jill Brown's "Business 2" identity) 9550: Ted Hamil's accounts, properties, assets, etc. 9555 are assigned to Jill Brown's GOID and mapped to her "Ted Hamil" identity. Jan Thomas (Jill Brown's "Getaways" identity) 9551: Jan Thomas's accounts, properties, assets, etc. 9556 are assigned to Jill Brown's GOID and mapped to her "Jan Thomas" identity.

In some examples these assignments and mappings are made in an IRD 9537 by means of appropriate tools and/or services 9537, wherein for each unique human user a unique Global Ownership Identifier (herein GOID) is generated 9538. One identity of said user is assigned and mapped to that user's GOID 9539, and (optionally) one or a plurality of that identity's accounts, properties, assets, etc. may be assigned to that user's GOID 9540 and to that identity 9540. The assigned and mapped identity, accounts, properties, assets, etc. 9539 9540 are then saved to the IRD 9541 (which may be in some examples a common and shared Identity Registration Directory [IRD], in some examples one appropriate IRD, in some examples a specific IRD, etc.). If said user has multiple identities then another identity 9542 may be assigned and mapped to a GOID 9539 9540 9541, and (optionally) that next identity's accounts, properties, assets, etc. 9543 may also be assigned and mapped to that next identity's GOID 9539 9540 9541. This process continues for subsequent multiple identities of that same user 9542 9543 until either there are no more identities 9544, the desired multiple identity assignments and mappings have been completed for the moment 9544, etc. In some examples these assignments and mappings are made using one or more external identity application(s) (such as described in 9476 9477 in FIG. 170). In some examples third-parties such as identity vendors, governances, etc. directly create(s)/edit(s)/delete(s)/configure(s)/etc. multiple identity information for a single user's or a family's multiple identities simultaneously.

In addition, each identity and its assets may (optionally) be flagged for a varying privacy or secrecy level by means of a Privacy Identifier (herein PID) 9557, that may have various levels of privacy and security as may be implemented, but are herein illustrated as Public (herein PB) 9557, Private (herein PV) 9557, and Secret (herein SC) 9557—but may have fewer, more or other privacy levels as may be utilized for varying purposes. In some examples illustrated in this figure, Jill Brown's multiple identities 9547 and ownership 9552 are set for varying PIDs (Privacy Identifiers) as follows: Jill Brown (Jill Brown's "job" identity) 9548: A public (PB) identity; Mary Mathews (Jill Brown's "Business 1" identity) 9549: A public (PB) identity; Ted Hamil (Jill Brown's "Business 2" identity) 9550: A secret (SC) identity; Jan Thomas (Jill Brown's "Getaways" identity) 9551: A private (PV) identity The use of said PID, identity registration and/or GOID 9534 9546 may be determined at the time of access by means of an appropriate gateway service(s), server(s), etc. 9560 that may determine if an access request is identity related, ownership related, etc. In some examples said gateway may be a module within a service 9560, whereas in some examples said gateway may be a distributed servlet that may be embedded within multiple services 9560, whereas in some examples said gateway 9560 may be provided by other varied means. In any case, said gateway 9560 may invoke a subsequent operation 9561 to authenticate and/or authorize functions and/or features of other applications, servers, services, etc. such as confirming one or more of a user's multiple identities; confirming an identity(ies)' ownership of an account(s), property (s), asset(s), etc.; providing authentication prior to transferring funds and/or ownership of an asset or property; or any other material identity, financial, ownership, etc. operation. In some examples said authentication 9561 may be provided by determining the requested identity or ownership 9562; authenticating it 9563; authorizing it 9563; issuing a credential, cookie, or other data item that may be stored as confirmation 9563, etc. 9563. During said authentication and authorization 9563, if additional information or data is needed from said user to validate identity or ownership 9564 that (optionally) may be requested 9564 and included in said authentication and authorization 9563. If a user needs to be contacted for additional information 9564, then (optionally) user assistance may be provided 9565 (such as secure means to provide assistance if a user forgot his or her password, forgot his or her user ID, etc.). Alternatively, if said operation 9562 determines that identity or ownership authorization are not needed 9562 then that is transmitted to the gateway 9560 so that it may proceed without needing additional authentication and/or authorization 9563.

In either case, if authentication and authorization are received 9561 9562 9563, or if authentication and authorization are not needed 9560 or 9562 9560, then said request 9560 may be processed 9566. Said processing 9566 is accomplished as described such as: Confirming one or more of a user's multiple identities 9546 9547 9548 9549 9550 9551; Confirming a public identity's ownership of an account(s), property(s), asset(s), etc. 9546 9547 9548 9553 or in some examples confirming a financial account ownership for a private identity 9551 9556; Providing authentication prior to transferring funds and/or ownership of an asset or property such as between a public identity and a secret identity 9549 9550 9554 9555; Or for any other material identity, financial, ownership, etc. operation 9566.

When identity and/or ownership requests are processed 9566 they may be recorded and stored for partial and/or comprehensive auditing 9567. In some examples one or a plurality of audit "warehouse(s)"/service(s)/server(s)/application(s)/framework(s)/vendor(s)/etc. may be provided for tracking, validating and/or auditing these distributed identity and/or ownership requests and/or operations 9566 by one or a plurality of sources. Said audit "warehouse" may be private or accessible by third-parties; within one network or distributed; centralized or decentralized; accessed by just one set of tools or broadly accessible by means of APIs, standard protocols, widgets, servlets, custom applications, client apps from multiple developers and/or vendors, etc.

In some examples processed requests 9566 are provided to said audit warehouse 9568 which determines if it is an auditable item or transaction 9568, and if it is not that may (optionally) be communicated to said process 9566. If it is an auditable item 9568 such as a transaction or change, then audit data is logged 9568 and the audit data/log is recorded and stored 9569 in said audit warehouse 9570. In some examples audit or logging modules, components, code snippets, APIs, etc. may be embedded within some or most processed requests to automatically "pull" auditable data from appropriate processed requests 9566 and operations 9566 and write said data to the audit warehouse 9569 9570 either on command or automatically. In some examples a plurality of IRDs or directories 9537 that provides identity and/or ownership authentication, authorization or data 9546 9547 9552 may have their own audit data warehouse(s) 9567, each collecting 9568 and recording 9569 appropriate data from authentications, authorizations, transactions, identity-related actions, etc. it enables. In some examples each of the external identity application(s) (such as described in 9476 9477 in FIG. 170) may have its own audit data warehouse(s) 9567, each collecting 9568 and recording 9569 data from the requested identity and/or ownership processes that it performs. In some examples said audit data warehouse(s) 9567 may be shared between one or more IRD or directory 9537, or may be shared between each of the external identity application(s) (such as described in 9476 9477 in FIG. 170).

In some examples said audit warehouse data is retrieved by a common set of central tools 9571 that may be accessed either locally and/or remotely to obtain relevant audit data. In some examples audit or logging modules, components, code snippets, APIs, etc. may be embedded within some or a plurality of external applications, services, etc. to retrieve and/or display appropriate recorded and stored items 9569 9570 (such as previous transactions, changes, transfers, etc.) from a central IRD 9537 or identity registration directory 9537. In some examples where there are a plurality of IRDs 9537 or identity registration directories 9537 that may each have its own audit data warehouse(s) 9567, then either centralized tools and/or components, code snippets, APIs, etc. may be embedded within some or a plurality of external applications, services, etc. to retrieve and/or display appropriate recorded and stored items 9569 9570 (such as previous transactions, changes, transfers, etc.) from a plurality of IRDS 9537 or a plurality of identity registration directories 9537. In some examples a plurality of or each of the external identity application(s) (such as described in 9476 9477 in FIG. 170) may have its own audit data warehouse(s) 9567, each collecting 9568 and recording 9569 data from the requested identity and/or ownership processes that it performs, and in this case, one or more of the modules or components of said external identity application(s) may retrieve and/or display appropriate recorded and stored items 9569 9570 (such as previous transactions, changes, transfers, etc.) from that application's own audit data warehouse(s) 9567. In some examples functionality may be distributed to third parties by means of multiple identity registration directories; in some examples functionality may be distributed to third parties by means of APIs; in some examples functionality may be distributed to third parties by means of third-party applications; in some examples functionality may be distributed to third parties by means of distributed storage; in some examples functionality may be distributed to third parties by means of audit warehouses; or by any known means so that independent vendors and/or developers may provide additional identity confirmation services, auditing, applications, functions, features, etc.

While a plurality of different types of identities are possible with multiple identities, and the examples herein do not limit the types of multiple identities that may be developed, some types of identities in some examples illustrate varying levels of privacy 9557 that include:

Public—Personal/Work (herein Jill Brown 9548 Mary Matthews 9549): A public identity is visible and accessible publicly, to anyone who shares the public life space, or shares the personal life space(s) of either of these identities.

Private—Personal (herein Jan Thomas 9551): A private identity is not visible publicly, though it is visible and accessible to anyone this identity includes in one or a plurality of its private life space(s).

Secret—Secret (herein 9550): A secret identity is not visible or accessible to anyone, and its only contacts are the outgoing ones this person initiates when he or she is conducting activities, business, traveling, or doing anything else as this secret identity.

Setup devices for use by multiple identities: A single device may serve a plurality of identities each which may have multiple subscriptions/services/etc., and operate across one or more networks. Alternatively, a single identity may utilize a plurality of devices and networks to access a single subscription/service/etc. Therefore, devices and networks, services, servers, infrastructures, utilities, etc. need to process outgoing and incoming connections for each identity, each device, each network, each subscription/service/etc. and each use. In this Alternate Reality a standard device may optionally provide connections between one or multiple identities and one or a plurality of networks, services, servers, infrastructures, utilities, etc.

Turning now to FIG. 174 "Set up Multiple Devices for Use by Multiple Identities" means are disclosed for accomplishing this. In some examples the user of one of multiple identities 9574 uses a device such as an LTP 9577, an MTP 9577, an RTP 9575, an AID/AOD 9576, or a device 9578 that involves a use by one or a plurality of identities, such as Identity 2 ("Name 2") 9438 in FIG. 167. Setup of appropriate multi-identity devices is performed by one or more setup program(s), module(s), component(s), service(s), etc. 9580 9590 9594 9600. Said setup begin by associating a user's identities and devices 9581 in which said user's multiple identities 9581 (such as Identity 1 9582, Identity 2 9583 through Identity N 9584) are associated with the multiple devices used by each identity 9585 (such as devices used by Identity 1 9586, devices used by Identity 2 9587, through devices used by Identity N 9588). Said association is accomplished by similar means employed in providing one or a plurality of multiple identity management interfaces such as illustrated in FIG. 169 in which a user could select one identity 9463 from a plurality of identities 9462, and see its associated devices 9460, services 9459, etc. 9461. In some examples said associated lists of multiple identities 9581 9582 9583 9584 and devices 9585 9586 9587 9588 are used to compile a list of identities for each device 9590. In some examples "Device A's" list 9591 may include Identity 1, Identity 2, and other identities through Identity N; and "Device B's" list 9592 may include Identity 1, Identity 3 and Identity 4. In some examples said device/identity lists 9590 9591 9592 are used to access each identity's profile for each device and compile a list of services, networks, etc. 9594 that each identity accesses. In some examples "Device A's" list 9595 may include Service A, Network B, and other connections through Connection N; and "Device B's" list 9596 may include Network C, Service D, and other connections through Connection N.

To actually set up each multiple identity device 9574, these lists of identities 9581, devices associated with each identity 9585, list of identities for each device 9590, and list of services/networks/etc. for each device 9594 are utilized in a cyclical setup process 9600 in which a first device is connected, registered and configured for one connection at a time 9600 with this process repeated until that device's connections are complete; then a second device is connected, registered and configured for one connection at a time 9600 with this process repeated until that device's connections are complete; etc. until the applicable devices are set up. Said connection and configuration process is described elsewhere but its high-level process is provided herein as: Connect, register and configure a device with one identity's first service or network 9601; Determine if the device connects to another service or network with the same or a different identity 9602; If no, end the setup process 9603; If yes connect, register and configure the device with that or another identity's next service or network 9604; Determine if the device connects to another service or network with the same or a different identity 9605; End if it does not 9603, or continue with another setup 9604 if there is another remaining to be done. In some examples functionality may be distributed to third-parties and or developed and provided by third-parties such as device manufacturers; in some examples functionality may be distributed to third-parties and or developed and provided by third-parties such as third-party vendors; in some examples functionality may be distributed to third-parties and or developed and provided by third-parties such as network vendors (in some examples mobile phone vendors, cable TV vendors, VoIP vendors, etc.); in these and other examples by means of multiple setup processes, APIs, third-party applications, distributed functionality, etc. independent vendors and/or developers may provide additional multiple identity device setup services, applications, functions, features, etc.

Simultaneous use and/or sign-on by multiple devices for one or a plurality of identities: In an Alternate Reality with multiple identities a user may have a plurality of devices that each need to connect by using two or more identities, each with its own network(s), subscription(s), saved connections (such as phone numbers), installed applications, profile and/or configuration(s), etc. Some examples that provide this are illustrated in FIG. 175 "Simultaneous Use and/or Sign-On by Devices for One or Multiple Identities." This figure includes devices that can support multiple subscriber identities on one device, devices that can support multiple different network connections, and devices that can support multiple simultaneous connections sessions.

Turning now to FIG. 175 some examples begin with an individual user's devices that can connect from multiple identities in multiple sessions 6910 such as an RTP 6911, an LTP 6913, AIDs/AODs 6912, and devices 6914. Simultaneous use of a device by multiple identities 9616 may occur in some examples. In some examples a device may support multiple identities: For a first use of a device select either one identity or a plurality of identities available on that device 9617 9618 9627 9628. In some examples a device may be used sequentially by multiple identities, so for a subsequent use of the same device select either one identity, a plurality of identities available on that device 9624 9627 9628. In some examples a private identity and/or a secret identity may (optionally) require entering one or more passwords 9627 9628 when signing on for one or more of said identities, if sign-on is needed (such as for a private or secret identity 9628). In some examples said identity(ies) selection may be made by various means one of which is illustrated as a checkbox list 9627 in which check marks are used to make one or multiple identity selections such as in using the example multiple identities of some examples such as user "John B. Smith" in FIG. 169: Individual identities: One or more individual identities may be checked and selected (such as Family: John, Work: John B. Smith, Business: Nelson Kennedy, Researcher: Hugh McCann, Traveler: Kurt Bennett, Partying: Eric Scott, Virtual: Angelica); A group of identities: One or more groups of identities may be checked and selected (such as Career Group, or Fun Group); All identities: All identities may be checked and selected (such as the "All Identities" check box).

In some examples 9616 after one or multiple identity(ies) are selected 9617 then one of those identities is selected for a first use of the device 9618. Until device use begins 9618 said device remains idle and ready for use 9626. When device use begins 9619, however, an indication of an outgoing connection for that registered identity 9620 may include any known means such as a contact list(s), bookmarks, any type of shortcut such as those that may be provided by a service or subscription, manual entry of a contact or phone number, an application such as a VTP (Virtual Teleportal), etc. based on that indication of a connection 9620 then the device connects 9621 and is used 9622. When said use 9622 is ended 9623 the device returns to an idle state 9626 in which it is ready for use.

In some examples said previous use requires authentication and/or authorization (as described elsewhere such as 9511 in FIG. 172 or 9563 in FIG. 173) and in this case if said user and device possesses stored authentication and/or authorization, that is transmitted 9621 if requested by the service, subscription, etc. with which the connection is made; or that stored authorization is transmitted 9621 if that transmission is part of the programmatic instructions for making that connection. After said authentication and/or authorization 9621 are received and accepted, use of the device 9622 begins.

In some examples said device(s) 9610 9611 9612 9613 9614 may operate in different networks and/or systems (such as each of the different US and European cellular network systems, or such as different types of networks that may be accessed by means of Wi-Fi, wired Ethernet, cellular radio-telephone, or such as the open public Internet and a private VPN Internet service, etc.). In some examples after the indication of an outgoing connection for one identity 9620, said device connects to the appropriate network based upon indications such as the connection type 9621, the service being connected to 9621, the presence or absence of network access points within range of the device 9621, etc. After said appropriate network is selected from a plurality of connection options and said connection is made 9621, use of the device 9622 begins.

In some examples if said device 9610 9611 9612 9613 9614 can technically support it, it may simultaneously engage in a plurality of sessions by a plurality of identities over a plurality of network connections and connection types. In this case, after one identity has been selected for a first use of the device 9618, and after a connection is made 9620 9621, and after the device is in use 9622, then simultaneous with said continuation of that use 9623 a user may select the same or a different identity for another use of that device 9624. After that additional selection is made, the device may be used by that subsequent identity 9624 for that subsequent use 9625. In that case, the indication of an outgoing connection for that subsequent identity 9620 may be implemented and result in a connection to the same or an additional network and/or service 9621, including (optionally) transmitting authentication and authorization is stored and requested 9621, culminating in the second simultaneous use of said device in a simultaneous second session 9622. Subsequent additional sessions may be added 9623 9624 9625 9620 9621 9622 as desired by the user and as supported by the device 9610.

While this describes devices that may serve users with multiple identities by means that include for some examples providing varying levels of privacy and security to each of multiple identities, in some examples providing transmission of stored authentication and/or authorization for the use of various protected services, in some examples connecting with one or a plurality of networks or types of networks, and in some examples support multiple simultaneous sessions on a single device, etc. The components of these and other examples may consist of any combination of components, modules, systems, processes, methods, services, etc. at a single location or at multiple locations, wherein any device, location or communication network(s) includes any of various hardware, software, communication, security or other features.

TP applications (6412): The Applications 6412 in FIG. 135 that run on the Teleportal Utility (TPU) 6400 are illustrated in FIG. 8 which describes multiple TP devices 137 and components, and FIG. 3 which includes multiple applications 6412 that run on said components, such as the following:

Local Teleportal devices/Mobile Teleportal devices: Local Teleportals (LTP) 132 in FIG. 4B and Mobile Teleportals (MTP) 132 may run Applications that run wholly on the LTP/MTP, or partly on the LTPs/MTPs, partly on the TPU and partly on third-party servers and systems. Remote Teleportal devices: Remote Teleportals (RTP) 133 may run Applications that run wholly on the RTP, or partly on the RTPs, partly on the Teleportal Utility (TPU) and partly on third-party servers and systems. Alternate Teleportal devices: Alternative Input Devices (AID) 134 and Alternative Output Devices (AOD) 134 may run Applications that run wholly on an AID/AOD, or partly on an AIDs/AODs, partly on the Teleportal Utility (TPU) and partly on third-party servers and systems. TP networks and systems: Teleportal Network 131 and 64 52 in FIG. 2 and Other Teleportal Networks 58 59 (some examples of these "Other Teleportal Networks" are listed in FIG. 2 and may include Social Networks, Business Networks, Sports Networks, Education Networks, etc.) may include Applications that run wholly in a TPN, or partly on TP devices, partly on the Teleportal Utility (TPU) and partly on third-party servers and systems. TP Shared Space Network (TPSSN): Teleportal Shared Space Network 55 may include Applications that run partly on TP devices, partly on the Teleportal Utility (TPU) and (if a service from a third-party vendor or partner) partly on third-party servers and systems. TP Broadcast Network (TPBN): Teleportal Broadcast Network 53 includes Applications that may run wholly on one TP device, or partly on TP devices, partly on the Teleportal Utility (TPU) and (if a service from a third-party vendor or partner) partly on third-party servers and systems. TP access to a plurality of types of applications such as those from third-party vendors or partners: TP Applications Network(s) 53 includes Applications that may run wholly at a third-party vendor, or run partly on TP devices, partly on the Teleportal Utility (TPU) and (if a service from a third-party vendor or partner) partly on third-party servers and systems. Utilizing computing and other resources remotely: TP Remote Control 54 60 61 includes Applications that run partly on TP devices, partly on the Teleportal Utility (TPU) and (if a service from a third-party vendor or partner) partly on third-party servers and systems. Adding Teleportals to multiple devices, etc.: Virtual Teleportals 60 61 includes Applications that run partly on TP devices, partly on the Teleportal Utility (TPU) and (if a service from a third-party vendor or partner) partly on third-party servers and systems. Accessing Entertainments and/or RealWorld Entertainment: Entertainment 62 63 and/or RealWorld Entertainment includes applications that in some examples run partly on TP devices, in some examples partly on the Teleportal Utility (TPU) and (if all or a plurality of components include a service from a third-party vendor or partner) in some examples partly on third-party servers and systems.

While the applications layer of the Teleportal Utility (TPU) 6412 in FIG. 135 is being described by means of the successively more detailed related and nested processes illustrated in FIGS. 176 through 182, this discloses a methodology that may be implemented in a wide range of situations, sequences, equivalents, etc. to accomplish the desired results as herein illustrated. In the examples the components of TPU applications may consist of any combination of devices, components, modules, systems, processes, methods, services, etc. at a single location or at multiple locations, wherein any location or communication network(s) includes any of various hardware, software, communication, security or other components.

Location of the components and services described in FIGS. 176 through 182: Sufficient bandwidth between the devices (such as LTP's, RTP's, MTP's, AIDs/AODs, etc.) and TP Network servers and storage, and third-party services, products, servers, storage, etc. enables the location of the components to become increasingly virtualized and abstracted so that an application or service no longer needs to run on a local TP device, a TP server or a third-party server but can instead utilize the increasing speed of networks and computers to locate both services and applications throughout the TPM such as on one or a plurality of TP devices, TP servers, third-party resources, "cloud" services, "edge" servers, etc. As described in the Virtualization layer 6422 in FIG. 135 this may be increasingly implemented with less regard for where high quality video and audio data are generated, transmitted, consumed or stored (in some examples including high-definition video and audio) to provide efficient creation, editing, storage, processing, playback, etc. Increasingly abundant computing power, networking and bandwidth permits implementation during the evolution of computing (e.g., with increasing speed, scope, storage, bandwidth, etc.) to do what is most advantageous for the users or for the TPM, with diminishing concern for computing and network constraints.

TP applications services—sources of applications and services: Turning now to FIG. 176, TP Devices 9036 such as LTP's, MTP's, RTP's, AID's/AOD's make requests 9037 and receive responses 9038. The actual services run 9041 9042 by the TP Utility 9040 may come from sources such as: Build: TP services built 9044; Buy: TP services bought 9046; Reuse: TP services from third-parties that are reused 9048 such as various web services, widgets, open source applications or code, etc.

This expands the build 9044 vs buy 9046 vs external (third-party)/reuse 9048 options to include available sources such as third-party vendors, online services, the World Wide Web, etc. The TP Services Architecture (TSA) is about interchanging applications and services that may be from a plurality of sources in some examples vendors, web services, third-parties, TP customers/users, etc. In some examples buying a single "out of the box solution" 9046 may be a shortcut to jump starting parts of said TSA, but if said "solution" is tightly integrated within itself then expanding it to include other services 9044 9046 9048 may be difficult, which sacrifices flexibility—so packaged software may be only one of varied ways to accelerate parts of the TSA. In some examples the Teleportal Services Architecture (TSA) can make it possible to add or remove applications and services so that the Teleportal Utility (TPU) can add new business opportunities, new technologies, new vendors, products and services. Thus, a packaged software "solution" 9046 parallels one component of a TSA, which includes:

Built TP Services 9044 9045: The architecture and strategy is varied but includes loosely coupled services that have standardized interfaces. These loosely coupled services can be built by employees, contractors, consultants or a packaged software vendors' products (primarily if its interfaces are standards-based, extensible, open and do not restrict the TSA to that vendor's approach).

Bought TP Services 9046 9047: Since most vendors do not sell commodity-level products (they add proprietary features and capabilities that both improve on current standards and lock customers into their products and customization services). If packaged software products are to be bought, they should be building blocks that are well structured to enable and multiple similar and different services from multiple sources to be linked together.

External/Third-party/Vendor/Reusable TP Services 9048 9049 9050: Components of the Teleportal Utility (TPU) may include third-party vendors 9049, customer-built services 9049, independent Web services 9050, services that are standards-based or industry based (such as Rosetta Net) 9050, enterprise services 9050, white label services 9050, etc. If services interoperate then their business processes, products and services should interoperate with the TP Platform—with both TP business processes and Teleportal users, so they can receive revenues from said participations. These services should communicate with and pass data to and from TP Services, to interoperate within TP business processes.

While the business processes are likely to be similar since they typically follow the general customer lifecycle 6456 in FIG. 135 and vendor lifecycle 6458, there are various differences in Teleportal uses. Though these uses sometimes have substantially different appearances and/or devices, they have an underlying common architecture as described in relevant descriptions such as 886 888 890 892 894 896 898 FIG. 155 Teleportal Services Architecture, and 6110 6160 FIG. 131 Brief Teleportal Networks Platform Summary.

TP application services—simple and complex applications: Turning now to FIG. 177 "TP Applications Services: Simple & Complex Apps," two types of application services are described, Simple Applications 9051 and Complex Applications 9057.

Simple Applications 9051: A plurality of types of simple applications provide services of the TP Platform, in some examples looking up and delivering information required to employ or perform a plurality of parts of the Platform's operations. Some examples include: From the usage side, the user of an LTP 9052 or an MTP 9052 may utilize this type of simple application 9051 to find and view RTP places in and around the Eiffel Tower in Paris, France. Also from the usage side, the user of an LTP 9052 or an MTP 9052 may not have TP Shared Spaces and want to use this type of simple application 9051 to see a list of Third-Party TP Shared Space services to choose one and purchase it. From the vendor side, a plurality of RTP broadcast locations 9052 (such as views of the Eiffel Tower in Paris) may be subscription services that require automated silent logins to enjoy their views (such as by means such as the One TP Sign-on service FIG. 157). While these may be free RTP services they may also be advertiser-supported and need to provide various statistics to advertisers of the numbers, identities and locations of viewers; with that data verifiable and/or auditable in some instances). Such an RTP 9052 may need to periodically use this type of application 9051 to gather and record said statistics so that it may report on its viewers.

In operation as depicted in FIG. 177 "Simple Applications" 9051, a TP device 9052 (such as an LTP, MTP, RTP, or an AID/AOD) makes a request 9053. Said request 9053 is received by TSBH 9054 (Teleportal Services Bus/Hubs described in the Teleportal Network Services layer 6418) which determines the appropriate TP Service 9056 and passes said request 9053 to it. Said TP Service 9056 processes said request (which may include a database lookup or other means of data retrieval) and prepares a response. If any form of transformation, mediation, etc. are required to said response that is performed by integration means at said TSBH 9054. The appropriately formatted response 9057 from said TP Service 9056 is passed to the original TP device 9052 for recording or display to its user. If no TSBH transformation, mediation, etc. are required to the response from said TP Service 9056, then said response 9057 may be communicated directly to the original TP device 9052.

Complex Applications 9057: A plurality of types of complex applications 9057 are described throughout the examples some of which include: TP Shared Space(s) that include collaboration services delivered by a third-party vendor. TP Broadcasts that include third-party advertising services. In brief, these include and integrate two or more TP Services 9062 9066 as well as optional TP Sub-services 9064, any of which may be provided by the TP Platform or a Third-Party Vendor. Appropriate choreography, workflows, mediation, transformation, etc. are provided by TSBH 9060.

In operation as depicted in FIG. 177 "Complex Applications" 9057, a TP device 9058 (such as an LTP, MTP, RTP, or an AID/AOD) makes a request 9059. Said request is received by TSBH 9060 which determines the appropriate TP Workflow 9060. Said TP Workflow determines the appropriate TP Services 9062 9066 and controls the invocation, sequencing and communications between said TP Services. In some examples said TP Services may be invoked sequentially and asynchronously such first invoking said top service 9062 in FIG. 177, and after that has completed and produce a workflow product, then invoking the bottom TP Service 9066. Alternatively, said TP Services may be invoked in parallel by invoking both TP Services 9062 and 9066. In addition, said workflow 9060 may be published as a Web Service 9061. Regardless of whether said workflow and invocation are sequential, parallel or published and consumed as one Web Service 9061, each participating TP Service 9062 9066 processes said request 9059 appropriately and may include a database lookup or other means of data retrieval. Any individual TP Service 9062 may include one or more TP Subservices 9064. If any form of transformation, mediation, integration, etc. are required either between the TP Services 9062 9066, that is performed at said TSBH 9054. After said TP Services are complete an appropriately formatted response 9067 from said TP Services 9062 9066 9064 is passed to the original TP device 9058 for recording or display to its user.

TP multi-sources applications services processes: Turning now to FIG. 178 "TP Multi-Sources Applications Services Processes," said TP Workflows 9060 9061 are illustrated by means of a basic Teleportal business process 9068 which comprises some of the usual lifecycle stages in buying and using typical TP and devices and services. The lifecycle stages illustrated in this figure include obtain prices and/or information 9072, place an order(s) 9082, use the device and/or service 9092, and then add new device(s), or uses:

Obtain price(s) and/or information 9072: These illustrate the workflow and combination of services at each stage of this lifecycle. To begin, a prospect or existing customer requests information or prices 9073. An appropriate workflow 9074 is invoked which utilizes TP services 9076 9077 from internal or third-party sources 9069 9070 by sending each a request 9075. Each external service 9076 9077 retrieves appropriate information and/or price(s) and responds 9078. Said responses 9078 are received and displayed to the user 9079.

Place an order(s) 9082: After a decision is made, the customer places the order(s) 9083 by means of buying and payment service(s) 9084. Since a single purchase 9083 may include both a TP device(s) and/or a TP service(s) from two or more third-party vendors 9069 9070, and appropriate in buying workflow 9084 is utilized. Said workflow 9084 invokes TP buying services 9086 9087 by sending each the appropriate purchasing data 9085 and service request 9085. Each external service 9086 9087 processes its buying request and responds 9088 with appropriate information that is displayed for the customer 9089, including such information as a confirmation(s), receipt(s), shipping information, etc. 9089. Said buying workflow 9084 and third-party services 9086 9087 may also trigger other buying and ordering services 9082 such as providing the customer with responses that are received and displayed to the user 9089 such as shipping notification(s) 9089 and delivery(ies) information 9089.

Use the device(s) and/or service(s) 9092: After a device is received, installed and working (as described in FIG. 160 "New Teleportal Customer Devices Orchestrations") customers may use 9092 the varied TP Services to which they have subscribed or purchased. To begin, a customer selects a service 9093 and either employs an automated and stored credential (as described in FIG. 157 "One TP Sign-on Service"), or signs on manually. Each TP use to which said customer is entitled is stored in the customer's profile and/or the device's profile so the correct TP service or third-party vendor can be selected automatically 9094. This process is described in more detail in FIG. 180 below, but in brief, an appropriate workflow 9094 invokes the appropriate TP Services 9096 9097 which may be from TPU or third-party sources 9069 9070. Requests for said uses 9095 are communicated, and the uses of said services 9096 9097, along with any responses from them 9098, are displayed on the customer's devices 9099 and used 9099.

Add new device(s), or uses 9100: At this point 9100 customers are using their TP devices and TP Services. At any time they may choose to add additional devices or uses. To do so, they may: Request information, price(s) or a quotation 9101 9072; Place a new buying or subscription order(s) 9102 9082; Use a new TP device(s) 9103 9092; Use a new TP service(s) 9104 9092.

High-level customer-vendor lifecycle of TP applications: Turning now to FIG. 179 "High-Level Customer-Vendor Lifecycle of TP Applications" said TP Platform workflows are categorized by means of the typical business lifecycle employed by both customers 6456 in FIG. 135 and vendors 6458. FIG. 179 illustrates the business process and major categories of this lifecycle for both customers and vendors. Said high-level process begins when a TP device 9106 and/or TP user 9106 sends a request 9107 to the TP Network 9108. Said request initiates the appropriate business choreography (ies) and workflows 9110 9111, which in turn invokes the appropriate TP business workflows and services 9114, or usage choreography(ies) and workflow(s) 9112 9113, which in turn invokes the appropriate TP usage workflows and services 9115.

For customers this business lifecycle includes the major activities such as: Find 91109114; Buy 9110 9114; Receive 9110 9114; Install 9112 9115; Use 9112 9113 9115; Customer support or solve problems 9110 9114; Upgrade or replace 9113 9115.

For vendors this business lifecycle includes the major activities such as: Design/build 9110 9111 9114; Deploy/manufacture 9111 9114; Sell 9110 9114; Use 9112 9113 9115; Customer support or solve problems 9110 9114; Upgrade or replace 9113 9115.

In some examples both business and usage workflows and services fit this high-level process such as: A credit workflow and/or service 9110 9114: Credit check, credit approval, credit response or notification; A payment/billing workflow and/or service 9110 9114: Payment/billing notification, accept payment, payment received, billing reminder(s); An inventory workflow and/or service 9111 9114: Reserve inventory, release inventory, inventory response or notification; A shipment workflow and/or service 9111 9114: Shipment (with a sub-service for each shipping vendor), shipment response or notification; Uses workflow(s) and/or service(s) 9112 9113 9115: see FIG. 180 below.

TP process to run applications: Continuing with FIG. 179 when devices are used for initial services 9112 and for ongoing uses 9113, said uses may include a wide range of applications 9115. Turning now to FIG. 180 "Teleportal Process to Run Applications" the process is illustrated whereby a Teleportal Device such as a RTP 9117, LTP 9117, MTP 9117 or AID/AOD 9117 utilizes the Teleportal Network. Said process begins when said TP Network 9118 receives one or more requests for any of its uses or capabilities from said device or user 9118. If said device or user 9117 has stored and automatically transmitted appropriate identification and authorization data with which to be automatically authorized 9119, then authentication and authorization for that use are completed automatically for said device or user, in some examples as described in 9120 9124 in FIG. 157 "One TP Sign-on".

If device or user 9117 has not pre-stored and transmitted appropriate identification and authorization data then among the first services to be invoked 9120 may be authentication and authorization 9121 if it is needed to ensure that the request is valid. If not authenticated 9122: Said request 9118 is responded to as not authenticated or invalid 9122. Retry or fall-back if not authenticated 9122: Said request may have an "N tries" process to login and gain access. As a fall-back if not authenticated 9122, said request 9118 may have displayed opportunities to retry said login 9122 9121, or to employ a secondary or tertiary means to obtain access, such as by having a password e-mailed to them 9122 9121. If the TP device or user 9117 are then confirmed as authorized and authenticated 9121, metering is started 9124 and the session is established as if the device or user had been pre-authorized 9119. Authentication failure 9122 9123: If authentication fails 9122 said request 9118 may have displayed an opportunity to buy or subscribe to said requested service for a price 9123, offered as a free promotion 9123, or blocked as an authentication failure 9123. If offered for purchase 9123 or a free trial 9123 information may be displayed to explain said offering, or links may be displayed so user may obtain said information if desired. If a purchase is made 9123 or a free trial offer is accepted 9123 then the TP device or user 9117 are then confirmed as authorized and authenticated 9121, metering is started 9124 and the session is established. If not, said request 9118 is blocked as an authentication failure 9125 and said user/device 9117 are notified.

After authentication and authorization 9119 9120 9121 complete successfully and metering 9124 is initiated, a session is established and the application requested 9118 is selected and run by a "Select and Run Applications Service" 9132 and FIG. 181 below. Said service 9132 identifies the category of application requested 9118. Said categories may include those listed in FIG. 3 such as in some examples Teleportal Network 9126 9134; in some examples Teleportal Shared Space(s) 9127 9135; in some examples Teleportal Digital Realities 9128 9136; in some examples Virtual Teleportals and Teleportal Remote-Controlled Devices or Applications 9128 9137; in some examples Entertainment 9130 9138; in some examples RealWorld Entertainment 9130 9138; in some examples Teleportal Broadcasts 9141; in some examples other TPU Services or Applications 9131 9139 9142.

Each request 9118 and authorization 9119 9120 9121 may include and communicate parameters such as values like device type and ID, location, user and ID, plan or subscription, and values like security credentials from said authorization. In addition, each category 9126 9127 9128 9129 9130 9131 may be described by parameters such as its category name, category type, relevant applications for said category, address such as a URL, virtual addresses, etc.

Said "Select and Run Applications Service" 9132 utilizes parameter data from each request 9118 and each category 9126 9127 9128 9129 9130 9131 to specify the workflow, applications and operations to be performed. Said operations are performed by a command and the relevant parameters with one common command schema 9143 applying such as: Start application/Start workflow; Stop application/Stop workflow; Get status/display status; Get event; Write event; Open/close; Load/unload; Retrieve/save; Etc.

As a result, each TP category retrieves the appropriate Application Workflow(s) 9132 by identifying and running each, with appropriate parameters passed to each said workflow: Teleportals 9134; Teleportal Shared Space(s) 9135; Teleportal Digital Realities 9136; Remote Control Teleportaling (RCTP) 9137; Virtual Teleportals (VTP) 9137; Entertainments and/or Real World Entertainments 9138; Other Teleportal Networks 9139; Teleportal Services and Applications 9140; Teleportal Broadcasts 9141; Other Teleportal Applications 9142.

Each of these TP categories contains workflows that have their own applications with appropriate functions, operations and features so that each workflow may be treated as a reusable single service even though it may actually run multiple services and sub-services from multiple sources. In some examples if individually chargeable, the TP categories may include appropriate metering 9124 9144 9145 so that their start 9124, stop 9145 and/or chargeable events 9143 9144 are noted and published for use 9144 or recorded in the Metered Events Database 9144. Alternatively, each event 9144 may have its start 9124, stop 9145, and appropriate workflow events 9143 9144 published 9144 and/or recorded 9144 for later analysis and potential billing. After said requested use(s) 9118 are completed and ended by said user or device 9117 their ending is metered 9145 and written to said Metered Events Database 9145, and said process is terminated 9146.

Adding an entirely new category of TP Application(s) becomes systematic because the same process of requesting said new type of TP Application 9118 includes the relevant device and user parameters 9117, security authorization process 9120, metering process 9124 9144 9145, same common command schema 9143 for running said new workflow for that new category of TP Application(s), etc. The main new addition is to devise and deploy a new TP category 9126 9127 9128 9129 9130 9131 with a workflow(s) or application(s) 9134 9135 9136 9137 9138 9138 9140 9141 9142 for said new TP category, which can then be treated as a broadly reusable TP category by said "Teleportal Process to Run Applications" FIG. 180. Therefore, this provides an extensible applications architecture that supports both initial and new TP categories, with new TP categories of TP Applications that may be added to expand the functionality, usefulness and contributions from one or a plurality of Teleportal Utility(ies) (TPU).

TP device and session process to run multiple applications: FIG. 181 is described by means of two scenarios. In both the same user actions, TP Applications for Services, and sources are employed—but two different situations occur. The fact that two different scenarios can utilize similar or the same communication patterns and tools illustrates how a single TP Platform can serve ranges of different needs and integrate resources from a plurality of currently separate tools and resources. In both of these scenarios the user: Opens multiple TP applications; Uses a TP Shared Space; Records and archives it; Edits that recording, adding new narration; Broadcasts the edited TP Shared Space one or a plurality of times to one or a plurality of audiences; Writes and publishes a blog or project record with the recorded and edited TP Shared Space embedded.

In both of these scenarios the common factors include:

| # | User Action | TP Application(s) or Service(s) | Source(s) |
|---|---|---|---|
| 1 | Open RTP View | RTP Viewing Service | TP |
| 2 | Open Remote Control of PC | TP Remote Control of Windows PC (App or Service) | TP or Third Party |
| 3 | Open Web Browser | TP Web Browsing (App or Service) | TP or Third Party |
| 4 | Open TP Shared Space | TP Address Book, TP Dialer, TP Shared Space (Apps or Services) | TP or Third Party |
| 5 | Share #1, #2, #3 in TP Shared Space | TP Views Sharing (App or Service) | TP or Third Party |
| 6 | Record TP Shared Space | TP Recording (App or Service) | TP or Third Party |

-continued

| # | User Action | TP Application(s) or Service(s) | Source(s) |
|---|---|---|---|
| 7 | Edit TP Shared Space | TP Edit Recording (App or Service) | TP or Third Party |
| 8 | Broadcast Edited Shared Space with Brief Narrated Intro | TP Broadcasting, TP ViewMail (Apps or Services) | TP or Third Party |
| 9 | Write Project Record, Wiki or Blog; Embed TP Shared Space Broadcast | TP Creation of Website, Blog or Wiki; TP Voice Recognition (Apps or Services) | TP or Third Party |

Turning now to FIG. 181, "TP Device & Session Process to Run Multiple Applications," both of the following scenarios are illustrated. This process begins when a TP device or virtual Teleportal is connected to a network and sends a request for a TP Application 9148. At the receiving end, the appropriate TP Service 9149 is online and "listening" for said request (e.g., said TP Service can be idle or waiting in a loop for said request). After said user or device is authorized and authenticated 9150 as described above such as in FIG. 180, which also determines if said user and/or device are authorized to invoke said request 9148, then a TP Capability Service 9152 confirms whether said TP device has the capability to run said requested TP Application 9153. The TP Platform may employ a plurality of types of AID/AOD devices that may each have different capabilities, such as whether it includes audio components such as a microphone and/or speaker. This is also helpful when a TP device is already running multiple TP Applications and it may not have sufficient memory or processing capacity for a type of TP Application requested. Similarly, the TP Device may be utilizing its available network bandwidth (such as a cell phone with a single circuit) and it may not have bandwidth for the additional TP Application requested.

To do this said TP Capability Service begins with awareness of the applications currently running on said TP device, the features and functions available on said device, the bandwidth available to said TP device, and the requested TP Application's features and functions. It may then utilize one or more databases 9154 by means such as a Lookup Service to determine if the current type of TP device, given its existing configuration, bandwidth and running applications, has the capacity to run the new request. If the TP device's capacity appears insufficient 9155, then the user/device is notified 9156 with options for how to achieve said request (if possible). If the TP Application can be configured for said TP device, or if said TP device can be configured for said TP Application, then those stored extensions are retrieved 9154 for that TP Application and TP device, and run as a TP Device Extension Service 9157. The function of this TP Service is to reformat or translate the TP Application's presentation to fit said TP device. This TP Service 9157 expands the "footprint" or "reach" of TP Applications to fit more types of TP devices. If the TP device is of a nature that it cannot be modified automatically 9157 then it is deemed insufficient 9155 and the user/device is notified 9156 with the limitations identified; if possible, said user's other TP devices may be retrieved from storage 9154 so that the user may be informed of which other already authorized TP devices are capable of running said rejected TP Application request.

If the TP device's capacity appears sufficient 9153 (whether or not said optional TP Device Extension Service 9157 is run), then event metering is invoked 9167 9168 and one "Select and Run Applications Service" is invoked 9158 9160 9162 for each TP Application request 9148 as described above FIG. 180. In a first instance of said "Select and Run Applications Service" invocation 9158, the workflow for the TP Application requested is performed 9159 and appropriate events are metered 9168. While said TP Application is running, if a second TP Application is requested 9148, then TP device's capability is confirmed 9152 9153, and said "Select and Run Applications Service" is invoked 9160, said second TP Application workflow is performed 9161 and its appropriate events are metered 9168. Similarly, while multiple TP Applications are running, if a new TP Application is requested 9148, the TP device's capability is confirmed 9152 9153, and said "Select and Run Applications Service" is invoked 9162, said new TP Application workflow is performed 9163 and its appropriate events are metered 9168. If the first TP Application is ended 9164 then its metering 9167 9168 is ended 9169. Similarly, when each TP Application is ended 9165 9166 the metering for each application 9168 is also ended 9169.

This is an extensible and flexible process that may be employed by both Teleportal customers and vendors: This TP process FIG. 181 allows the TP Platform to add new TP Categories for new types of TP Applications such as described in FIG. 180. It also supports TP Applications from different sources in each TP Category, such as multiple TP Shared Space vendors where each vendor utilizes this common TP process and interface to deliver its own a unique set of TP Shared Space products, services and features. By means of the TP Device Capability Service 9152 and the optional TP Device Extension Service 9157 it also maximizes the nature and types of TP devices on which said new TP Categories and new TP Applications may be run.

This process FIG. 181 is designed for both vendors and customers to add new TP Categories and/or new TP Applications by creating a new workflow(s) and publishing it as a new service for access from a TP Applications Registry. Said new workflows can be from an entirely separate vendor such as a Web Services or application software vendor, a TP customer who designs and launches a new type of application, or it may combine reusable Teleportal Services with a vendor's or customer's unique executables and/or execution environment (including those from "cloud hosting" services). If latency is an issue during actual use then Metered Events 9167 9168 9167 and appropriate TP Platform QoS Services may be employed to provide intelligent provisioning to compare planned vs actual latencies, identify delays and establish automated policies to overcome them.

Two instantiations of said "TP Session Process to Run Multiple Applications" are presented to illustrate said process based on FIG. 181 and the table just above:

Scenario 1—Solving a Business Problem: In the first scenario, in the evening a user needs to work on an overdue shipment problem that includes coworkers and shippers located around the world, so the evening hours are more convenient to connect with them in their local time zones. To resolve this shipping problem this user opens multiple TP applications 9148 9149 9150 9152 9167 9158 9159 9160 9161 9162 9163 9168: RTP View: The RTP view opened is the inside of his company warehouse where the shipment must be expedited as soon as it arrives; TP Remote Control: The TP RC view opened is of his Windows PC that shows the schedule that will be slipped because this shipment is late; TP Web Browser: The TP browser opened includes a VPN login to his company's internal purchasing and shipping system.

After skimming the relevant data and leaving the above views open and running, the user enters a TP Shared Space, which includes invoking multiple TP applications 9148 9149

9150 9152 9167 9158 9159 9160 9161 9162 9163 9168: TP Address Book: First the user opens a work address book which is separate from personal addresses for security, and chooses the TP Shared Space participants. TP Sharing: Next the user turns on TP Sharing for the three views opened (RTP view, TP Remote Control view, and TP Web browser view) so that Shared Space participants can see them if they are using a Teleportal. TP Recording: Then the user starts TP Recording to make a record of the Shared Space for later editing and broadcasting. As required by law in the user's area this automatically displays a notice that "this Shared Space is being recorded" which is visible to participants who can see the TP Shared Space. TP Dialer: When the user initiates the Shared Space a TP Dialer automatically contacts the participants either sequentially or at once, with each one called in the communication device order specified in the participant's directory entry (such as Local Teleportal, business phone, cell phone—with the TP Dialer waiting a pre-specified amount of time (such as for a reasonable number of ring tones) before trying the next communication device. TP Shared Space: When connected the meeting begins. The team discusses the shipping problem and determines the best solution. It updates the project schedule to match the new shipping dates. A team member agrees to contact the shipping company to find the shipment and have it re-routed so it goes to a new final destination, not the company warehouse, and does this in the background on her LTP while the group continues collaborating via the TP Shared Space. In the background that person also put the company warehouse on alert in case the shipment turned up there so it would be expedited and sent to where it is needed.

After the TP Shared Space the user edits the recording, saves and TP broadcasts the recording, and adds the event and broadcasted recording to a website 9148 9149 9150 9152 9167 9158 9159 9160 9161 9162 9163 9168: TP Edit Recording: After the TP Shared Space the user edits the recording to keep only the resolution and action items for this problem. As part of editing the user may (optionally) record a video and/or audio introduction or narration (which is inserted at the appropriate place[s]) as well as inserting or attaching resources (and/or pointers to resources) to make it clear what is expected from each person involved in the solution. TP Broadcast to TP ViewMail: The user then uses TP Broadcast to send the edited TP Shared Space to those who were at the meeting. Rather than phoning them the user sends the recording to their TP ViewMail, which is the Teleportal's visual voicemail service. This allows each of them to view this when and if they want it. TP Creation of Website: Finally the user employs TP Voice Recognition to add a text note, and embeds the TP Shared Space recording and the updated project schedule from the user's PC.

Scenario 2—A New Way to Help Others: In the second scenario a user wants to help others. To do this, the user does some research, then connects with others and proposes an entirely new way so that others in a plurality of locations may help others when they want. The user opens multiple TP Applications 9148 9149 9150 9152 9167 9158 9159 9160 9161 9162 9163 9168: RTP View: The user opens several RTP views showing views of the environment around the user's city, such as the closest wilderness river, state park, and a hiking trail on a nearby mountain. TP Augmentation: With TP Augmentation the user is able to see information on each of these, such as GPS coordinates, and links to interactive guides to each of these areas on each one's Website. TP Web Browser: The user opens a TP Web Browser with multiple tabs that provide additional information on each of the locations. Each has a guide(s) formatted for cell phones with GPS and is interactive so people who go out to enjoy these environmental resources may have an interactive guide(s) to each place that uses GPS to automatically follow their current location. By looking at the real-time RTP views, however, the user can see ways anyone can help such as by picking up litter on the hiking trail, or by contacting the river's water Management District about what might be an algae bloom (you'd have to be there to be sure). By checking the Websites' interactive guides, the user sees that there is no way to note these problems or enlist others in fixing them. TP Remote Control: The user opens a TP Remote Control view of his Windows PC and brings up Microsoft PowerPoint and creates a brief presentation about adding a "Help Fix This" list that can be added to interactive guides that are run using cell phones—with this type of service people could interactively solve problems with solutions such as "Bring a small garbage bag so you can help pick up litter along this hiking trail," or "Contact the river's Water Management Agency to tell them there is an algae bloom at this GPS location." Presentation run by TP Remote Control: The user prepares a presentation that shows how this "Help Fix This" service can be added as a small icon that when clicked reads the cell phone's GPS coordinates and relevant Website(s), application(s), or other augmented information that helps identify the user's current activity or task, and attaches them to a text title. The user can then enter either a text or voice message about what needs to be fixed, and automatically send the bundle of information by cell phone.

After skimming his address book and leaving the above views open and running, the user enters a TP Shared Space to several technical colleagues who are members of one of his professional associations 9148 9149 9150 9152 9167 9158 9159 9160 9161 9162 9163 9168: TP Address Book: First the user opens a personal address book which is separate from work addresses for security, and chooses the TP Shared Space participants. TP Sharing: Next the user turns on TP Sharing for the views opened (RTP views, TP Web browser view of the interactive guides on the environmental Websites, and the TP Remote Control view of a presentation on his PC) so Shared Space participants can see them if they are using a Teleportal. TP Recording: Then the user starts TP Recording to make a record of the Shared Space for later editing and broadcasting. As required by law in the user's area this automatically displays a notice that "this Shared Space is being recorded" which is visible to participants who can see the TP Shared Space. TP Dialer: When the user initiates the Shared Space a TP Dialer automatically contacts the participants either sequentially or at once, with each one called in the communication device order specified in the address book such as Local Teleportal (LTP), business phone, cell phone—with the TP Dialer waiting a pre-specified amount of time (such as for a reasonable number of ring tones) before trying the next communication device. TP Shared Space: When connected the user begins the Shared Space by discussing that a universal problem is that people spot things that need to be fixed in many situations but have no way to record that so that others are able to help fix them. The user might share and show several issues in the RTP views, the interactive guides that are available from cell phones for people in those situations, and the proposed "Help Fix This" list that is illustrated in the presentation. Several on the TP Shared Space are interested and stay on while some drop off (e.g., leave the TPP Shared Space). Those remaining divide up the tasks of developing and packaging this in their spare time, but realize that they are technically focused and without sufficient marketing expertise. One of those on the TP Shared Space has a friend who runs the marketing for an entrepreneurial company and connects with her and they add her to the TP Shared Space. She "gets it," says she would like to help and suggests that the original idea was a good one—to stimulate wide adoption they should make "Help Fix This" available for free to non-profit organizations, charities, schools, and other types of community services. They could make it possible for anyone to be a continuous volunteer who may help make improvements more easily.

After the TP Shared Space the user edits the recording, saves and TP broadcasts the recording, and creates a project Wiki page to which is added the project description, broadcasted recording and the PC presentation file 9148 9149 9150 9152 9167 9158 9159 9160 9161 9162 9163 9168: TP Edit Recording: After the TP Shared Space the user edits the recording to keep main decisions and action items for this project. As part of this the user may (optionally) record a video and/or audio introduction or narration (which is inserted at the appropriate place[s]) as well as inserting or attaching resources (and/or pointers to resources) to make it clear what is needed and expected from those helping deliver the solution. TP Broadcast to TP ViewMail: The user then uses TP Broadcast to send the edited TP Shared Space to those who decided to participate. Rather than phoning them the user sends the recording to their TP ViewMail, which is the Teleportal's visual voicemail service. This allows each of them to view this when they want to review and confirm what they decided. TP Creation of Wiki: Finally the user uses TP Online Creation Tools to create a new Wiki that requires a password to login. The user employs TP Voice Recognition to add a brief project description, then schedules the recorded and edited TP Shared Space to be broadcast one or a plurality of times, along with access to the presentation file that illustrates the "Help Fix This" idea.

Select and run TP application service: FIG. 182 "Select and Run TP Application Service" illustrates the direct relationship between the sequence of a running a TP Application described in 9167 9158 9159 9168 9169 9164 FIG. 181 and the TP Application workflow performed. As illustrated in this FIG. 182 events metering is invoked 9172 9173 and one "Select and Run Applications Service" is invoked for a TP Application request, the workflow for the requested TP Application is performed 9175 and appropriate events metered 9173. When this TP Application 9175 is ended then metering 9176 9173 is ended and the service is terminated 9177.

In this figure the running of two of said TP Applications workflows 9132 9134 9135 9136 9137 9138 9139 9140 9141 9142 in FIG. 180 are illustrated. As illustrated previously, said "Select and Run Applications Service" 9174 utilizes parameter data from each request 9118 in FIG. 180 and each TP Category 9126 9127 9128 9129 9130 9131 to specify the workflow, applications and operations to be performed. Said operations are performed by commands such as those listed in 9143 and the explanation of FIG. 180, along with the relevant parameters. This one common command schema may apply to said TP Categories so that it is direct for the "Select and Run TP Application Service" to identify and run each workflow, including passing the appropriate parameters to each said workflow. The two TP applications illustrated in this figure includes a TP Shared Space and a TP Remote Control Session:

TP Shared Space 9175 9180 9181 9182: The TP Shared Space category contains workflows that have their own applications with appropriate functions, operations and features so that each workflow may be treated as a reusable service even though it may actually run multiple services and sub-services from multiple sources. In FIG. 182 a TP Shared Space may be invoked and that may display the TP Address Book Service 9180 to initiate that TP Shared Space. When the user selects the recipient(s) from the TP address book and initiates the Shared Space, this service runs the TP Shared Space Dialer Service 9181 which initiates the Shared Space and runs the TP Shared Space Applications Service Workflow 9182 from the Teleportal Utility (TPU) or from a TP Shared Space vendor subscribed to by this customer (a parameter passed to this workflow, obtained from this user's profile, or parameter(s) that may be provided to this service by a previously run process). Said TP Address Book Service 9180 may access contacts from locally stored addresses 9184 or one or more remotely stored addresses by means of a TP network server(s) 9195 and a TP network directory(ies) 9196. Alternatively, a TP Shared Space may be invoked by a different means without utilizing the TP Address Book Service 9180. In this case the TP Shared Space Dialer Service 9181 initiates the Shared Space and runs the TP Shared Space Applications Service Workflow 9182 from the Teleportal Utility (TPU) or from a TP Shared Space vendor subscribed to by this customer (e.g., parameters that may be retrieved by this service from this user's profile, or parameter(s) that may be provided to this service by a previously run process). Each TP Shared Space vendor may have one or more TP Shared Space workflows, and the appropriate TP Shared Space workflow is retrieved from storage and run by the TP Shared Space Applications Service 9182. This permits each vendor to offer and sell different types and classes of TP Shared Space products and services, such as to provide a product range that includes varying levels of basic through premium features, security and services. In some examples workflow from "Vendor X" illustrated in TP Shared Space Applications Service 9182 a local user 9183 is employing a TP device 9183 such as a Local Teleportal to run the TP Shared Space application 9183. In addition and simultaneously, said user is employing said TP device to run other TP applications namely a Remote Teleportal view 9186 that is streamed and received from an external RTP 9186, a remote control session of a Windows PC 9187, a view of a different and unique TP Network 9188 such as a lesson in a course on an educational TP Network 9190, another TP application 9189 9191 (such as illustrated as "Other TP Applications" 9142 in FIG. 180), etc. The user 9183 has the option of not sharing, or sharing some or all of the currently running views as visible TP applications during the TP Shared Space 9183 by means of the TP Sharing Service 9185; in this case 9182 the user chooses to share currently running views 9186 9187 9188 9189 by means of the TP Sharing Service 9185. Said TP Sharing Service 9185 may also be used selectively to share one or a plurality of the running applications (but not those that are explicitly not shared) by means of a sharing selection interface through which the user does not share (e.g., keep everything private except the TP Shared Space), share one or a plurality of the running applications (e.g., keep some private and share some publicly in the TP Shared Space), or share the entire LTP during the TP Shared Space. At the local user's discretion 9183 Said TP Sharing Service 9185 may or may not allow the remote user 9193 to control shared TP Applications 9186 9187 9188 9198 such as a Windows PC 9187. By means of said TP Sharing Service 9185, local devices can be provided as remotely controllable resources that may be used remotely by users (or groups of users) permitted to make use of said devices. When said local user 9183 runs said TP Shared Space Application 9183 said user may also access TP Shared Space addresses as noted above by means of the TP Address Book Service 9180, which may access locally stored addresses 9184 or remotely stored addresses 9196. Said TP Shared Space Application 9183 uses a TP Shared Space via a synchronous real-time communications connection 9192. This TP Shared Space "Vendor X" utilizes synchronous communications 9192 between TP Shared Space participants to reduce latency and increase QoS (Quality of Service). At the receiving TP device 9193, a corresponding and compatible TP Shared Space Application 9193 is run. If more remote users and locations are included in this TP Shared Space, then additional instances of corresponding and compatible TP Shared Space Applications 9193 are run, and additional synchronous real-time communication connections 9192 are established. Said synchronous real-time connection 9192 may be monitored for Quality of Service (QoS) by TP Shared Space Vendor X's service 9195 running on said vendor's TP server(s) 9195 utilizing stored policies 9197, stored Shared Space performance data 9197, and other stored parameters and algorithms 9197 to (as needed) reduce TP Shared Space latency and maintain quality at or above specified levels. Appropriate TP Shared Space events between said users 9183 or 9193 are monitored 9173. When either of said users 9183 or 9193 leaves TP Shared Space 9192 then that ending is metered 9176 9173 and written to said metered events database, and said workflow 9175 9182 and service processes 9174 9182 are terminated 9177.

TP Remote Control 9175 9200: The TP Remote Control category contains workflows that have their own applications with appropriate functions, operations and features so that each workflow may be treated as a reusable service even though each workflow may actually run multiple services and sub-services from multiple sources. In FIG. 182 a TP Remote Control session may be invoked 9200 and that may display the TP device's list(s) of available devices 9201 that may be controlled remotely. When the user selects the devices from the list (such as a cable TV source 9202 or a Windows PC 9207) and initiates the remote control session, this TP Remote Control Application Service runs the appropriate remote control hardware and application 9201. Said remote control application may be retrieved from storage 9203 along with any additional parameters or data required to control each device from each vendor. Some examples include Cable-TV Set-Top Boxes 9202: If said user chooses a cable TV set-top box 9202, then the appropriate application and device parameters are retrieved from storage 9203, that application is run 9204 and said user utilizes the application's interface to run the cable TV set-top box 9205, and display the cable TV's signal in a view on the TP device 9206. Some examples include Windows PCs 9207: If said user chooses a Windows PC 9207, then the appropriate application (like Windows Remote Desktop using RDP [Remote Desktop Protocol]) and device parameters (such as username and password) are retrieved from storage 9203, that application is run 9208 and said user utilizes the applications interface to run the Windows PC 9209, and display/hear/use the PC's output on the TP device 9206. A remotely controlled device such as a cable TV set-top box 9205 or a Windows PC 9209 may be shared with one or more remote TP users such as illustrated in the TP Sharing Service 9185 within the TP Shared Space Application Service workflow 9182. When said user ends the TP remote control session 9205 9209 then that ending is metered 9176 9173 and written to said metered events database 9176 and said workflow 9175 and service process 9174 are terminated 9177.

Therefore, by means of these two illustrations (TP Shared Space 9182 and TP Remote Control 9200) it can be seen that there is a common sequence for running the TP Categories 9126 9127 9128 9129 9130 9131 in FIG. 180, such that there are a plurality of TP Application workflows 9134 9135 9136 9137 9138 9139 9140 9141 9142 in a plurality of said TP Categories, and within each of said TP Categories the appropriate workflow required by each user and/or third-party vendor(s) may be retrieved and run. In addition, as illustrated previously, adding entirely new categories of TP Category (ies) and TP Application(s) becomes systematic because of this same repeatable and reusable process to Select & Run TP Applications.

PRESENTATION/USER EXPERIENCE/USER INTERFACE(S) (6410): Today people face a blizzard of new technology that is often so difficult to use that many new features and capabilities remain rarely used. This blocks much of the productivity and performance gains promised by new technologies. Might it be possible to make this dilemma obsolete, by making a plurality of today's new and powerful technologies easier, more productive and beneficial on the first day they're launched?

Historically, when PC's were operated by DOS and complex software, the introduction of Microsoft Windows and Office gave Microsoft the business opportunity to seize industry leadership, destroy competitors and receive billions in profits every quarter (from operating systems and all categories of office software). But later Microsoft reintroduced that problem with its Vista operating system and Office ribbon interface widely derided as difficult for average users. In a possible parallel business evolution to the first launch of Windows against DOS interfaces, the advent of Teleportals might provide a business opportunity to replace current industry leaders in multiple business categories. In some examples these industry categories might include PC software and PC systems (Microsoft and PC systems makers like Dell and HP), and cell phone networks (such as AT&T, Verizon and Sprint in the USA), mobile device vendors (such as Nokia, Apple, RIM, Samsung, etc.), etc.

One of the drivers for this may be the user experience, just as this was a major driver behind Microsoft's success when the first versions of Windows and Office defeated the DOS software leaders (such as Lotus and WordPerfect). This Teleportal Utility (TPU) "Presentation/User Experience/User Interface(s)" is explained and illustrated by means of four figures: FIG. 183 "User Experience" provides a comparison of today's difficult user experience with multiple technical devices and systems, compared to a common interface and experience with Teleportaling. FIG. 184 "TP Client Model and Capability Service" illustrates the processes of providing a customized, personalized yet consistent interface for all of the TP devices employed by each user. FIG. 185 "Adaptive User Interfaces" illustrates said TP Client Model and Capability Service as a configuration process that is performed once, then stored and used—with means for updating the interface whenever needed due to adding or ending any TP service, wanting new capabilities, personal preferences, etc. FIG. 186 "TP Interface Components Process" elucidates the process of selecting components so it is clear (1) how users receive a consistent interface across their TP devices, (2) the sources of interface components include TP customers and users, and (3) how consistent improvements in interface quality is a built-in part of both preparing each TP client, and also part of developing new interface components. FIG. 187 "TP Interface Presentation" illustrates how the TP Interface is both consistent yet flexible, modular and able to evolve to include new technologies, vendors, and an expanding range of TP products and services with a minimum of integration effort—so that new additions may be made by both vendors and by users.

The core component of the "Presentation/User Experience/User Interface(s)" is to provide consistent and clear high-level patterns, yet within each pattern open the door wide to easily added and potentially large, transforming improvements in the ways people are able to communicate and work together. The sources of these may be large industry-leading companies, new technology startups, one or a plurality of individual users who provide input or advances, etc. This TP Architecture provides capabilities so that each addition may be included in a service(s) that other services may use. In some examples of this is FIG. 186 in which interface components 9298 may be stored and retrieved from repositories 9306 9309 and applied in new interface designs 9300 9301 to construct various new services 9302 9303 9308 or to update existing services 9304 9301 9302 9303 9308.

Location of each interface component: While it remains somewhat helpful to locate each interface component where user inputs can be replied to quicker (in some examples locally, in "edge" services, at multiple servers located near their intended users, etc.), this requirement declines over time as bandwidth increases, local processing power and storage increase, the use of cloud computing becomes more accessible for individual users as well as vendors, the use of individual widgets or services that update separately, and TP Virtualization decouples the location of an interface component and service from how anyone may create and deliver new improvements. As a result, stored components 9306 9309 may include templates (layouts), designs (appearance), patterns (functions), portlets (components), widgets (components), servlets (components), applications (software), features (e.g., sharing, presence, speech), APIs, etc.

Continuous improvement is built in: The TP Interface Components Process changes the business model for consistent user interface development to a potentially accelerated creation of mature, intuitive, increasingly familiar and stable interfaces that may be run on a plurality of types of devices. Sources of components 9299 9310 may include TP GCE services 9311, TPU applications 9312, third-party vendors 9313, third-party web services 9314, TP customers 9316, other TP interface component sources, 9315, etc. The best of these may be determined by means such as performance statistics 9317, most successful patterns 9317, best practices 9317, etc. and saved to one or a plurality of TP interface and components repositories 9316 9306.

Currently, companies like Microsoft have achieved saturated markets for their products, so revenue increases must come from forcing existing customers to upgrade to new versions of the products they already own. It has been said that a business requirement is therefore to force future upgrades on customers who feel they don't need or want them.

Alternatively, the TP interface process is designed to produce continuous improvements as illustrated in FIG. 189 so that maturing and successful interface(s) and associated services are routinely delivered to both new and existing customers—an advantage for customers over a current business model that relies on breaking down customers so they are forced to buy unwanted upgrades (with repeatedly changed interfaces that supposedly justify that a "new" product is being sold when it often resells a similar pig with new lipstick, an updated name and a list of new "features"—even though most upgraded users employ primarily the same features in both old and new products). This TP process provides a plurality of sources 9356 (including TP customers 9358) to conceive, develop and distribute consistent, effective interface components 9362 9361 and associated services components 9362 9361 so that users may participate in producing greater productivity and success that is then routinely used by individuals, businesses, societies and economies—without an upgrade treadmill whose costs include lost productivity and expense.

Current vs TP user experience (6410): After spending trillions of dollars putting in high-speed communications networks, buying billions of PCs and cell phones, as well as buying other kinds of new devices and software, just how productive are these vendors' customers? How well do we actually connect and work effectively with a plurality of other people, including different kinds of people, all over the world? One serious obstacle is the large numbers of differently designed devices and software applications, each with their unique interface designs, feature names, and functionality. Just because a technical product designed by engineers can have "any time, anywhere access" doesn't mean that its users find it possible to turn it on and accomplish this, much less do it at global volume and scale. In fact, all too often engineers design products quickly and push them into the marketplace before they are usable for an average person, knowing that new features help marketing sell them, even if those features are not widely usable.

Using a mature product design is more intuitive for an average user because the user can focus on the task and ignore the product. Some examples include turning on a television set and watching any channel, or making a local telephone call. The PC, on the other hand, has had a graphical interface for 20 years but a recent generation of the most common operating system (Microsoft Vista) and Microsoft Office software (Microsoft Office 2007's ribbon interface) leave far too many functioning at basic levels rather than functioning as productive experts.

Instead of supporting intuitive tasks where users don't pay attention to the product, far too many modern technology devices and software constantly interrupt their users' tasks to make how to use their varied interfaces the focus—to employ a feature, users must stop and figure out how to use the product to do the task. The result is a process this inventor calls "frequent interruptions" which at best could be called a limited success, and at worst yields too many task failures.

This current situation and a solution are illustrated in FIG. 183 "User Experience". In today's situation 9210 (without Teleportaling) large categories of devices are not connected with each other, but are only connected in separate silos with the same type of device. Some examples include PCs, telephones, televisions, etc. but the fragmentation is even greater than at this category level because each category's sub-technologies also have different interfaces on different devices and software. In some examples cell phone SMS text messaging which is implemented differently on different brands and models of cell phones depending on their software and keypads, and are also different when text messaging is implemented in other products like PC software, web widgets from third-party web services, etc. To illustrate this principle at a high level a plurality of types of communications addressed by this include the five concentric circles in the left "bull's-eye" in FIG. 183: Real 9212: People who are physically present with you. Real-time communications 9213: Telephone (landline and mobile phone), SMS text messaging, IM instant messaging, real-time web applications, online games, entertainments, etc. Asynchronous communications 9214: E-mail, voicemail, social networking, blogs, RSS feeds, E-alerts, etc. Media communications 9215: Television, radio, static Websites, E-news, E-zines, E-newsletters, E-books, webcams, etc. Printed communications 9216: Paper newspapers, magazines, books, libraries, etc.

From a historical perspective, today's digital age is still young and immature since it is barely 50 years old. For comparison, in the first 50 years of printing (after Gutenberg's invention of the printing press) printing and the designs of those first published documents were based on calligraphic handwritten books and hardly mature. But at the start of printing there were only a relatively few printed pieces, with small print runs, because most people could not read, mass markets did not exist, and distribution channels were small and limited. Today's production systems create new copies quickly, most of humanity can read, product development employs "fast follower" strategies on what succeeds, and mass marketing is ferociously competitive—so the majority of people are affected by the expanding and accelerating transformation of an enveloping digital world—except this transformation is limited by the average user's difficulties in productively accessing and using today's Babel of devices, designs, new applications, new services, and their myriad different interfaces that are often changed partly to justify upgraded versions that generate new revenues. Thus, we have little choice but to turn today's chaos into the start of a process by which technologies mature faster.

By means of this 9218, the user's experience and ease-of-use may be simplified, so that today's multiple separate uses and applications (depicted as rings) 9210 9213 9214 9215 are reduced to one digital zone 9218 9221 for much that is based on electronic bits, along with a shrinking paper-based print zone 9216 (while paper is increasingly merged into the digital zone 9221 with expanding use of e-paper and new devices like tablets or pads). This more accurately reflects a digital world, rather than the past-based one of the current reality. Across the Teleportaling digital zone the same interface and ease of use are provided across a plurality of devices and types of uses 9219. These include LTP's, RTP's, MTP's, VTP's, AIDs/AODs (such as PCs, cell phones, TVs, print online, online games), etc. As a result, the ease of use of the future could resemble Real 9212: People who are physically present with you. Teleportal Platform zone 9213 9214 9215: this includes real-time communications 9213, asynchronous communications 9214, media communications 9215, etc. This also includes FIG. 3's types of networks 64 52 53 55 58, devices 52, remote control of other devices 54 60 61, entertainments 62, RealWorld Entertainments 62, TP Broadcasts 53, etc. Printed communications 9216: Newspapers, magazines, books, libraries, etc.

Overall, the TPU is designed as a system that can deliver continuously improving rates of customer success and satisfaction by means of an Interface Components Process that supports consistency across all of each user's TP devices for ease of use, plus template and pattern consistency, yet within each of these types of consistency can offer multiple applications from multiple vendors, evolving applications with new features, deployment of new interface components, minimal work by users to integrate any new interface components, and three-level control that includes automation, administration, and direction by each customer (user). This is achieved by means of the TPU's interface presentation layer 6410 in FIG. 135, in which TP applications and services 6412, TP business services 6414, TP device management 6416, TP network services 6418, partners and services ecosystems 6408, and other TP Networks and third-party applications 6404 are constructed for integration and composition by decomposing them into finer-grain reusable units—modular component-level integration. This does not bypass the underlying stored data which is accessible either directly or by means of virtualization 6422, and the use of said stored data (in which access is granted appropriately and securely). Nor does it bypass the business level where application logic and business processes reside, whether said logic and processes come from the TPU, from third-party vendors or from other sources.

TP client interface service (6410): The presentation/user experience/user interface(s) layer 6410 in FIG. 135 delivers the actual and visible TP user interface to a plurality of areas of Teleportaling including devices, services, applications, functions, data, personalization, etc. and contains attributes such as utility, usefulness, satisfaction accessibility, etc. These use known and proven interface technologies and processes (such as both portal and non-portal interfaces), open standards (such as WSRP), and composite application development (such as utilizing Web Services)—which yield development and implementation by means of reusable components. To accomplish this it includes capabilities for creating the front-end interfaces for TP applications such as TP services, TP networks, TP portals, TP business systems, TP broadcasts, TP channels, TP Shared Space(s), virtual Teleportals, and Entertainment/RealWorld Entertainment. This layer also includes application to application communication such as passing user entered data to the appropriate application(s) that utilize said data. This layer may be decoupled from other layers such that interface components may be assembled from a range of prebuilt and custom sources into composite application interfaces that are then available in those apps separate from the TPM, whether they are displayed on a TP device, an AID/AOD, or a non-TP device.

As described in FIG. 184 "TP Device Interface Service", the core TP device interface is a single client superset 9238 of Teleportal technology capabilities including full multimedia viewing, recording, creation, editing, communicating and broadcasting with multiple simultaneous input and output streams and channels for use on capable TP devices 9222 9223 9224. Additionally, the TP Platform may employ a plurality of types of AID/AOD devices 9224 (as well as LTP's 9223, MTP's 9223, RTP's 9222, etc.) that may each have different capabilities, such as whether it includes audio components like a microphone and/or speaker, or a sufficiently powerful CPU/memory/storage for video editing. Therefore, more limited subsets of the TP Client superset may be auto-configured 9226 and run 9230 9232 9234 9236. That is, the starting point is a TP Client Model superset 9238 that includes a range of advanced media computing capabilities 9238 such as: CPUs (high speed); CPUs (rich media capacity); CPUs (media editing capacity); CPUs (broadcasting capacity); Display (reasonable size); Display (high resolution); Display (new technology such as 3D, projection, etc.); Display (multimedia); Display (less latency); Input (point/click device); Input (keyboard, keypad); Input (track pad, trackball); Input (voice microphone); Input (touch screen); Input (gestures); Audio playback (monaural); Audio playback (stereo); Audio playback (surround); Memory (sufficient RAM); Storage (drive capacity); Storage (drive speed); Accelerometer (functions); GPS (location aware); Camera (resolution); Camera (communication integration); Communication (speed); Communication (bandwidth); Communication (wireless); OS (brand, version, quality); Security (type, maturity); Security (firewall); Security (anti-virus, spyware); Power (battery life); Etc.

Said multimedia capabilities 9238 are based on reusable patterns whose components may come from a range of existing and future pattern and component resources that may be located both remotely (e.g., outside the TP Network) as well as within the TP Network; that is, to select patterns and implement each one a developer may be able to choose from a plurality of interface components from various sources, so that applications, services, products, etc. may be tailored to varying requirements. Reusable patterns and reusable components reduce complexity both during design and development, and later during maintenance, which provides: Simpler design and development; Lower costs for development, deployment and maintenance; Greater focus on developing better and more reusable modular components such that future components may more usable, functional, and have other improvements over current components—and may be "plugged in" as upgrades to current components; A common high-quality user presentation interface for a range of communication, computing and other services; An increasingly familiar customer entrance to a potentially growing range of products, services, business processes and E-commerce systems; Integration of this user interface capabilities with Teleportal services and individual third-party vendor services such as One TP Sign-On, and Teleportal Platform Business Services (such as in FIG. 162 "Teleportal Business Revenues"), and new TP devices discovery and installation (in some examples in FIG. 159 and FIG. 160).

As exemplified above, an appropriate TP Client FIG. 184 is dynamically created for each TP device such as an RTP 9222, an LTP 9223, an MTP 9223 or AIDs/AODs 9224. The TP Platform may employ a plurality of types of AID/AOD devices that may each have different capabilities (in some examples whether it includes audio components such as a microphone and/or speaker). The first TP Client step is to access the TP Device Client Capability Service 9226 which begins by confirming the capability(ies) 9227 of each device 9222 9223 9224 (which includes Virtual Teleportals as well as TP devices). To do this said TP Device Client Capability Service 9226 begins by recognizing each device then accessing the data on it 9228 to learn the capabilities of each said TP device, the features and functions available in said device, and the bandwidth available to said TP device from the network to which it is connected. If the TP device's capabilities appear sufficient then said service configures and runs 9229 and saves 9237 a Full Local TP Client (Superset) 9236 on said TP device. The list of features in said TP Client Superset 9238 are listed above.

If a TP device's capability 9227 9228 does not have the capabilities, features, functions and bandwidth to run said Full Local TP Client (Superset), then in some examples said service configures and runs 9229 and saves 9237 a Subset TP Client 9236 on said TP device. In some examples if a TP device's capability 9227 9228 does not have the capabilities, features, functions and bandwidth to run said Full Local TP Client (Superset), then said service configures and runs 9230 a Web-Based TP Client (Custom Subset) 9232 and saves its parameters to said user's and device's profiles on the TP Network 9233. In some examples if an AID/AOD device's capability 9227 9228 is sufficient to run a VTP (Virtual Teleportal), then said service configures and runs 9229 a Virtual TP Client (Custom Subset) 9234 and saves 9235 said Virtual TP Client preferably on said AID/AOD, but may optionally be stored and retrieved from the TPN. The list of features in each said TP Client Custom Subset 9232 9234 are those features that are appropriate for each said TP device or AID/AOD. The function of said TP Device Client Capability Service is to configure, run and save the TP Client's presentation to fit each said TP device. This TP Service 9226 expands the "footprint" or "reach" of Teleportaling to fit more types of devices. If the TP device is of a nature that an appropriate TP Client cannot be configured 9226 then it is deemed insufficient and the user/device is notified with the limitations identified and if an appropriate Web browser is available the use of a Web-based TP Client 9232 9233 provided. If possible, said user's other TP devices may be retrieved from storage 9228 so that the user may be informed of which other already authorized TP devices are capable of running an effective TP Client.

This Service 9226 is extensible and may be employed by both Teleportal customers and vendors: said TP Client Model and Capability Service FIG. 184 allows the TP Platform to add new TP Client capabilities for new types of TP devices as they are developed and added in the future. It also supports new device features and capabilities 9238 from different devices, in some examples when new types of gesture-based input may be developed and added so that each appropriate device vendor may utilize this new TP process to deliver its own devices' unique TP capabilities, services and features.

Said process 9226 in FIG. 184 is designed for both vendors and customers to add new TP devices by creating a new device capability list(s) 9238 and publishing it (them) for access 9227 9228 during TP Client configuration running 9230 9229 and saving 9233 9235 9237. This helps maximize the variety and types of TP devices that may be introduced and configured in the future.

Said TP Client Model FIG. 184 has the potential to deliver savings and productivity to users, as well as potentially expanding typical users' abilities to use a plurality of new or different types of communications, computing, products, services, etc. with broadly advancing features effectively. In some examples users interact directly with a client that encompasses usable patterns to do a wide range of tasks. They would no longer need to interact with an operating system such as Microsoft Vista which many find so frustrating that they have avoided using it by hanging on to older products. In addition, the eliminates the need to purchase some new and frustrating "upgrades" which may save customers both billions of dollars and large amounts of frustration—eliminating a "vendor tax" from both buying and using treadmill upgrades in fields such as computing and communications. That would make more upgrade purchases discretionary so those vendors' revenues would be based on what products deliver rather than a company's market power (e.g., its ability to force channel resellers and customers to be locked into buying its new versions of old products). Each company would therefore have an incentive to make its products what the market really needs because the market would only pay when a product actually adds value, not when a vendor wants upgrade revenues.

TP adaptive user interface(s) (6410): To illustrate an example of the TP Device Client Capability Service 9226 in FIG. 184, the Capability Confirmation 9227, we turn now to FIG. 185 "Adaptive User Interfaces." As illustrated above, said example begins with the device 9240 and the user's ID 9241. That is employed by Adaptive Interface Service 9242 9243 which to develop a custom TP interface for said in device 9240 by means of this process 9242. Said process runs a setup wizard 9244 that constructs an initial adapted interface by utilizing said in device information 9240 and user ID information 9241 to retrieve from storage 9248: User profile 9249 such as which services are subscribed to by said user 9241; Device profile 9250 such as which capabilities are present and accessible on said device, such as a microphone for input and speaker(s) for output; Patterns/components 9251 such as the appropriate interface designs and components for said user's 9241 services and uses, as filtered for those appropriate for said device 9240, which in some examples may include TP Shared Space patterns, interface portlets, SCA (service component architecture) components, and WSRP (Web Services for Remote Portlets). These steps utilize existing and emerging standards to simplify the custom development of a common user interface for presenting Teleportal products, E-business systems and TP services. Said setup wizard 9244 provides most of the logic for this process. It uses templates and other standard designs to provide an initial interface design that is consistent with what users receive as a known, predictable and consistently evolving front-end for utilizing Teleportaling across multiple devices.

With a known set of patterns and components 9251 it is optional for said user 9241 to employ the user interface patterns 9251 and components 9251 as a finished TP Client interface for said device 9240, but it is also possible for said user to choose which of multiple alternative components 9245 9251 are wanted within each pattern 9251, or their position on the screen (such as whether TP Broadcasts should be above or below TP Shared Spaces), as well as set preferences 9245 such as whether this TP Client interface is sharable or not (and by whom) such that said TP device 9240 may be made completely private to said user 9241, sharable by a selected group by means of logging in, or a publicly available resource for use by others in remote locations. Said user may then see and try using said interface layout 9246 or said customized layout 9245 9246 and make any changes needed by means such as dragging and dropping components in said layout 9246 or by editing said preferences 9245. When said interface layout 9246 is acceptable, the user finishes the setup 9246, which, depending on the device 9240, is one of three main types: Web-based TP Client (custom subset) 9254, which is stored on the Teleportal Network 9255; Virtual TP Client (custom subset) 9256 which is stored 9257 locally on said device 9240, but if that is not possible then it may be stored remotely on the Teleportal Network 9255; Full or partial local TP Client (superset or subset) 9258 which is stored 9259 locally on said device 9240.

Each finished adaptive user interface 9252 9254 9256 9258 is stored in an appropriate persistent location 9255 9257 9259 where it can be retrieved and parsed back into memory whenever each adapted user interface 9254 9256 9258 is run. As required, two additional processes (e.g. TP services) are available after an adaptive user interface 9252 has been created 9242 and stored 9255 9257 9259: Update interface, preferences and customization (user control) 9260: At any time the user chooses, the interface's layout template, patterns, components and/or preferences may be modified by said user. QOS (quality of service) adjustments (automated) 9261: In the same process described elsewhere for modifying QoS such as to reduce latency, the configuration of individual components for patterns of the user interface may be modified but any change that the user sees must first be approved by the user.

TP interface components process: As described in FIG. 185 said Setup Wizard 9244 utilizes information 9248 from user profile 9249, device profile 9250 and interface components 9251 to initiate the process of developing said TP Client 9252 9254 9256 9258. This is part of the TP Interface Components Process which is now described in FIG. 186. Said TP Interface Components Process FIG. 186 integrates a plurality of areas: Users/Devices: Actions 9297: These include both required and optional steps taken by TP users (customers), and performed by means of each of their TP devices, utilizing services and resources on the TP network and beyond it. Interface Components: Repositories 9298: These include the resources employed by the users and their devices to create, edit, use and modify said TP client and TP applications on each TP device. Interface Components Sources 9299: These include the sources 9310 of interface components 9306, as well as some of the development tools to create them 9317. TP Interface Improvement Service 9309: Actual use 9303 of said TP client provides metered data 9319 that may be employed by a TP Interface Improvement Service 9320 which assists developers in designing and developing 9317 more successful and usable interface components 9306, users by providing greater "weighting" when they create a new TP Client from interface components 9306, and assists users when they update their TP Client to add or replace any interface components.

Said Users/Devices: Actions 9297 were previously described in FIG. 185 but are here enumerated as part of the TP Interface Components Process:

TP interface consistency: The Setup Wizard 9300 first determines if said user 9241 in FIG. 185 has other TP devices with TP Clients by means of said user's profile 9307. If that is true, then said Setup Wizard 9300 utilizes said user's previous interface preferences and selections as the default selections for creating a new initial TP Client for another of said user's TP devices, so that said user experiences a consistent TP client interface across that user's TP devices. User may then edit said TP client's layout, components and features 9301.

TP interface improvement: If said user does not have other TP devices, then said Setup Wizard 9300 retrieves appropriate interface components from appropriate virtualized repositories 9298 9309 9306 to provide an initial TP Client design. Said interface components are "weighted" by means of the TP Interface Improvement Service 9320 so that components with the greatest usability (as determined by the rates of user success and failure in employing each component) are more likely to be included in said initial TP Client design. User may then edit said TP client's layout, components and features 9301.

User control: Said user may then edit said initial TP Client layout 9301 by accepting or changing any of the interface's components by utilizing a TP Interface Component Selection/Delivery Service 9309, which are stored in virtualized interface components repositories 9306—with changes made by means of selecting from visual lists (with drill down to more visuals and information on each selection) as in a plurality of portal interface design tools (such as iGoogle, MyYahoo, etc.). Based on said Interface Improvement Service 9320 the following lists of interface components 9306 may be sorted, weighted or have actual users access data appended so that the most successful components are most likely to be selected during said user editing of layouts, components and features 9301.

Users control Teleportaling by choosing and arranging interface components: Said interface components displayed by the TP Interface Component Selection/Delivery Service 9309 9306 may include: Templates 9306 (overall interface layouts for both a main interface and sub-pages or sub-windows); Designs 9306 (overall appearances such as color schemes and font styles); Patterns 9306 (user interface and interaction patterns are a well recognized way to present best-practice designs for common interface needs, which in turn make it easier for users to perform tasks because the interface designs are generally more familiar and easier to understand); Portlets 9306 (portlets are a plugged in interface component[s] that is displayed by a portal interface page; users can also rearrange them by dragging and dropping them into their preferred locations on said interface pages; they are standards-based so that a large body of Portlets is already available for use in standards-based interfaces); Widgets 9306 (interface widgets are elements of a GUI [Graphical User Interface] that provide individual and focused types of interactions for a single type of data; some examples include a window or a text box; while widgets were initially generic reusable tools such as buttons, they have evolved into thousands of small focused GUI applications that each provides one individual function such as a clock, mortgage calculator, news list, calendar, etc.); Servlets 9306 (servlets are API and standards-based objects that receive requests from a web container [such as a Portlet] and responds to said requests; each servlet may be packaged as a web application such as in a WAR file); Application software 9306 (while typically thought of as office software such as spreadsheets, word processors and Web browsers, in a TP client applications may also include video editors, address books or contact lists, an online video recorder/player, various types of collaboration tools, etc.; applications may be run by an Applications Portlet that can list one or more applications software packages that may be run by selecting each one individually; this portlet may have the appearance of a navigation zone, or it may be provided with a distinctive appearance for a functional purpose such as for video [with separate video applications, one integrated video application, etc.; with features such as recording, copying, organizing, titling, clipping, editing, posting online, sharing, burning, playing, broadcasting, etc.]; Features 9306 (features are capabilities of Teleportaling that are provided as discrete interfaces that in turn control each capability; in some examples these include (1) sharing, which provides the ability to share one's TP device so that others may control it and/or the devices it controls, (2) remote control, so that a TP device may control and/or access the output from other digital devices such as a PC, a cable TV set-top box, a mobile phone, etc., (3) Shared Planetary Life Space(s) which include presence visibility so that others may or may not see that you are online with your local device, allowing the user to turn this on or off for each device whether it is an LTP, a PC, a cell phone, or another type of device, (4) speech recognition, to simplify control, an optional Speech Recognition Service may provide an API so that TP devices and interfaces may be voice controlled, etc. such as a PC, cable TV set-top box, cell phone, etc.; Combinations that use interface components as services 9306 (the above interface components may be utilized 9310, such as by TP users 9300 9301 9302 9303 9304 9305 9316 for the purpose of developing 9317 new TP interface components 9306 for users 9309 9301 9304 9316; in some examples a user may want to provide a LTP as an externally controlled broadcast channel production and broadcasting resource so that users from around the world may create and run one or a plurality of broadcast channels that have access to a plurality of sources; to accomplish this, and to provide similar functionality as a capability to other LTP's owned and provided by other users in a plurality of locations, said user may combine a sharing feature 9306 with a video applications suite 9306 with remote control of a cable TV set-top box 9306 and remote control of a video editing PC 9306 and then publish this as a complete LTP remote broadcast channel production and broadcasting resource 9306 9309; with these types of resulting capabilities in one or a plurality of LTP "broadcast center" portal[s], remote users may access said LTP(s) to record, edit, organize, and broadcast multiple video channels from multiple sources); APIs (Application Programming Interfaces) 9306 (APIs are employed as protocols, routines, object classes, data structures, etc. to enable TP development. An API may be abstract and contain sample code along with its specification[s]).

Finishing each TP client: When finished with said TP client 9302 the TP client is automatically saved in the local TP device 9308 or on the TP Network 9308. A specification of its attributes and components is also saved in the user's profile 9307 to provide default selections when said user creates a new client for similar TP devices 9300 in the future. Alternatively, the user's profile may provide the information that said user has other TP devices, so that the current TP client information (template and components) may be employed to set the defaults for a new TP client.

Success and failure during use: When said TP client is used 9303 metered data is captured as described elsewhere and written to a metered event database 9319. Said metered data may include task failures as well as successes. If associated TP client data is also captured and recorded (such as which interface component was employed with each successful metered event, and with each failed metered event), then said metered event data 9319 may be accessed and employed by a TP Interface Improvement Service 9320.

Modifying the TP client: As needed or desired said user(s) may modify said TP client 9304 by means of the same process as described previously for selecting and editing the TP client layout, components and features 9301. This may be done as a normal part of adding or ending TP services or products because some interface components are associated with some TP services, so they need to be added when a new TP service is added, or they need to be removed when a TP service is ended. In addition, a user may want to change some part of their TP client interface.

Creating new TP features, services, or products: As part of TP use 9303 said user(s) may have new ideas for TP features, services, products, etc. 9305 that are not currently available, or may provide an innovative improvement that supersedes an interface component(s) that is currently available 9306, or combines multiple components into a new capability that may be delivered repetitively 9306 9309. If a user desires, said user may develop this 9316 by means of interface component development tools 9317 as a free or as a purchasable product or service that may then be saved to the TP Interface Components Repository 9318 9306. These new user-created interface components and expanded capabilities may be delivered to other TP users by means previously described (the process for selecting and editing layouts, components and features 9301, by means of the TP Interface Components Selection/Delivery Service 9309, TP interface components repositories 9306, etc.).

A related process is the creation and development of interface components 9299 by a variety of sources 9310 that may include:

TPU services 9311 and TPU applications 9312: Appropriate TP services and applications may be instantiated as interface components by means such as TP Portlets that can be developed 9317 utilizing data or best practices from the TP Interface Improvement Service 9320, then saved 9318 to the TP interface component repository(ies) 9306 for selection and use by users 9301 by means of the TP Interface Components Selection/Delivery Service 9309.

Third-party TP vendors 9313 and third-party TP Web services 9314: Utilizing a similar process, vendors of third-party TP services and products 9313, and vendors of third-party Web services 9314 may develop and deliver TP interface components 9317 9318 9320 9306 9309 to TP devices and users 9301.

Other TP interface component sources 9315: A large and growing range of standards-based interface components—and services run by them (such as Web services)—are accessible in the form of portlets, widgets, servlets, etc. These may be added to the TP interface components virtual repository 9306 by an interface components source 9310, by means of the appropriate development tools 9317 9318.

TP customers 9316: As described elsewhere, TP users (customers) 9305 may have new ideas for features, services, products, etc. and may utilize development tools 9317 9318 to create and add these as free or purchasable interface components 9309 9306.

Another related process is the Interface Improvement Service 9320. The TP Interface Components Process also includes means for improving TP interfaces, so that the present situation of being forced to use interfaces with disappointing levels of user frustration (such as global products like Microsoft Vista) can be avoided. In a reverse of the current market power churning, TP interfaces can produce positive improvements in user performance, productivity and satisfaction—rather than subtracting these, as Microsoft currently does from many by a forced march through upgrades to interfaces like Vista which many found difficult to use and whose problems reward Microsoft by forcing customers to upgrade again to its next operating system (Windows 7) sooner than needed. In addition, this improvement process provides means for users to replace a plurality of difficult or frustrating TP interface components with new components. In said TP Interface Components Process, actual use 9303 provides data to the previously described event metering, which may write appropriate recorded events to the previously described event metering database(s) 9319. If said metering includes events that fail as well as those that succeed, and if this also includes which interface components are used when successes and failures are produced, then said metered event data may be accessed by an Interface Improvement Service 9320 that correlates said performance data with interface components and designs 9298 to determine which produce higher rates of user success, as well as which produce the most user task failures.

Developers and development: For development of new interface components and template layouts, said interface performance data 9320 may be provided in various ways such as directly to said development tools 9317 as performance statistics; visual illustrations of the most successful interface patterns, components or layouts; best practices; etc. so that developers find it easier to create successful and more usable interface components.

Users and customers: For improving user's selection of the best performing interface components (and avoiding those that are too difficult), said interface performance and data 9320 may be provided in various ways to the stored data on each interface component 9306, as well as to the sorting and display process of the TP Interface Components Selection/Delivery Service 9309, so that users 9301 9304 may select the most successful interface layouts and components. In some examples in each category interface components may be sorted so the first ones are those that deliver the most successful user performance, and the least successful ones last, for choosing the best interface components and avoiding those that cause the most user difficulties.

To consider an overall view of the TP Interface Components Process, user control of interface components 9301 9304 may also mean controlling the behavior of individual interface components within said TP client 9302 9303. In some examples a portlet interface component may be set to run an external Web service, widget, servlet or application by means such as a button or link in said portlets. Alternatively, said portlet may be set so that in its default state it automatically runs, retrieves and displays data from an external Web service, widget, servlet or application—as well as provide the means to act upon said retrieved data. In some examples if an e-commerce vendor provides a portlet(s), widget(s), etc. to find items, to place orders and to see order status from said vendor, then said vendor's interface component(s) could automatically list the current status of all recent orders and their current shipment/delivery locations, with access to further details on each order from that order's retrieved current information. In addition, a vendor's interface component(s) such as said e-commerce vendor's interface component(s) may also provide access (whether run by pressing a button or auto-displayed by said component) to other e-commerce vendor order and account services such as product search, to a Wish List to place additional orders for saved items, etc. As an entire process, a third-party vendor 9313 such as an e-commerce vendor(s) could design and develop 9317 9318 an e-commerce TP interface component that provides a successful and usable design by utilizing information from said TP Interface Improvement Service 9320 such as performance statistics, most successful interface patterns, visual illustrations of successful components, and best practices. By that e-commerce vendor(s) saving said new interface component to the interface components repository 9306, it may be accessed and included in a TP client by other e-commerce vendors 9301 9304 by means of the TP Interface Components Selection/Delivery Service 9309. During use 9303 actual metered data is collected and stored 9319 such that the actual performance of said e-commerce vendor's interface component may be utilized in improving future interface designs and components 9320 both by TP developers 9317 and by TP users 9306. Therefore, that e-commerce vendor itself 9313 may periodically utilize said data 9320 to improve its own interface component 9317 9318 and distribute said continuous improvements 9306 to users and devices 9301 9304.

This is a substantial departure and innovation for the user interfaces of the spectrum of silo'ed devices and services FIG. 183 "User Experience." Most users of PC's and other technical purchases have been trained by their vendors to expect a static, inflexible and fairly difficult to use feature-overloaded interface such as Microsoft Vista and Microsoft Office's ribbon navigation. These are updated only once every few years and so many users find them difficult that they employ only a fraction of the capabilities and features that are paid for and possible. In summary and in contrast, the TP Interface Components Process supports a self-guided continuous improvement process for higher quality TP user interfaces that provides both TP developers 9317 and TP users 9301 9304 with information on user performance, success and failure so that they can select—and improve—a core set of interface designs that deliver accessible, reusable user success and satisfaction.

INTERFACE PRESENTATION (6410): FIG. 187 presents a component-based process for presenting the TP client interface, which reuses TP interface components, applications and services at the presentation level—with each component providing one part of said TP interface even though it provides access to a different service or application. This process envisions one or more interface pages depending on whether the types of interface components can be displayed on a single page, or are in sufficiently divergent categories that different types of pages are clearer than their simultaneous display. Therefore, several TP interface pages may be displayed in order to present all of the TP interface components. This may not an issue for devices such as LTP's and RTP's when they have sufficient real estate to display more than one TP interface page simultaneously. For illustration purposes FIG. 187 assumes that all types of interface components may be run from one TP interface page.

Said FIG. 187 is derived from known technologies that include numerous descriptions such as Weinreich, et al, "A Component Model . . . " which presents known technologies for component-based interfaces that "enable the integration of the user interfaces of different applications and services as components on the same web page" and also allows "the integration of remote, and also non-Java, portlets into portal servers and other applications acting as WSRP consumers." FIG. 187 shows a plurality of TP Interface Presentation capabilities:

TP client 9264: The TP client view 9265 displays a template layout selected as described above. It may include one or more navigation components 9266, and individual TP interface components such as a TP application 9268, a remote TP service 9269 and/or a local TP service 9270. As described elsewhere there may be more or fewer of these interface components, and they may come from a variety of sources. This TP interface page's structure is defined in the portal page descriptions 9276.

Declaration and controls 9267: These include each TP interface component 9265 9266 9268 9269 9270 comprising the overall TP client interface view 9265 as well as the individual TP interface components such as portlets, widgets, servlets, applications and features. Each of these decorations and controls may be displayed or not displayed, or displayed uniformly and consistently with all other decorations and controls within an overall "design" to provide a uniform appearance. This provides the ability to display two or more TP interface pages simultaneously on one LTP view while making them appear as one consistent interface.

Portal server(s) 9272 9292: One or more portal servers are run and FIG. 187 illustrates one main portal server 9272 along with an additional remote portal server 9292. Said main portal server 9272 defines a portal dispatch servlet 9277 which is how the TP client interface page is delivered and displayed. As described above, the TP interface components may be part of: Different Web and TP applications such as portlets 9278 9279 9280 which in turn request and run Web and TP applications 9286 such as servlets 9287 and static web information 9288; An applications portlet 9282 9283 which launches one or more applications 9290 9291; One or more portlets that may request services from or be part of remote application 9284 9285 9295, including running in a remote portal server 9292 9296 that may include a web server or servlet container 9293, and may also be a WSRP producer.

Partners/supply chain/services ecosystem(s) (6408): The TPU is agnostic: This layer of the TPU 6408 in FIG. 135 describes several changes from today's networks and company-owned products. The Teleportal infrastructure is network agnostic which means it supports and works with the types of networks in use today (below), and provides means for them to remain financially and technically successful. In fact, rather than challenging them, one goal of the Teleportal infrastructure is to be considered a profitable add on to them. In brief, these networks include optimized networks and the Internet:

Optimized networks designed and used for applications: Some examples are telephone networks (including cell phone networks) and cable/satellite television networks. These networks are owned and controlled by individual companies who each manage their network to maximize their revenues and profits. Investors can look at each company and consider it a separate investment, just as each of these companies is able to look at every service it provides and consider it a separate product that can be managed to maximize revenues and profits.

The Internet: In contrast the Internet does little more than send bits worldwide, but it does this for a fraction of the cost with higher speeds and capacity. This is because the Internet does not bear the costs of centrally managed optimization, management of individual products, expensive security, etc. However, the lack of management coupled with bandwidth also opens wider and more creative innovations. From Websites and Web browsing to streaming videos and music sharing, from e-mail to instant messaging and twittering, from e-commerce to drive-by downloads of software and multiple new types and formats for content, the Internet can keep adding innovative applications because all it does is move bits.

There is a natural and long-term difference between centrally managed and wide open networks. In some examples the Internet may make optimized networks into commodities because both telephone calls and television shows can be carried by the Internet at a fraction of what customers are charged by optimized networks. An example is e-mail versus text messaging: Email typically doesn't cost anything even if it includes an attachment like a 10 megabyte PowerPoint presentation file. In contrast, the current price for one cell phone text message is $0.20 (twenty cents) for one short message limited to a small number of characters, and a basic cell phone media plan includes only a few megabytes of data (such as 5 MB) before additional amounts are charged—and these prices are regional and each contact is an extra charge to send it worldwide. If mobile phones were Internet devices instead of tethered to one vendor's cell phone network, one low monthly Internet access charge would enable an unlimited amount of international phone calls and services (whether unlimited text messages or watching video television shows) without additional charges for volume, different types of services or global sending and receiving. The difference in quality and security, however, are obvious. Optimized networks focus on providing a higher level of service, support, security and repair then the Internet. Both types of networks not only coexist, most people buy their Internet connection from an ISP (Internet Service Provider) by means of a cable modem, over the telephone network via a DSL modem, etc. Those customers can easily add an Internet telephone line by using the VOIP (Voice over Internet Protocol), or watch Internet streaming videos that include television shows, other multimedia content, etc. Thus the same Internet is increasingly carrying even more content and media over an Internet subscription than over an often higher priced cable television service. Similarly, the same telephone network increasingly carries VOIP telephone calls (in some examples local calls, domestic nationwide calls, international calls, etc.) over its Internet connection instead of carrying the same international phone calls over its high priced telephone network.

As this layer of the TPU shows, it is agnostic about these types of networks (Internet, telephone, cable, etc.). Technically, it can run over any of them (even at the same time). Financially, the TPU includes metering so it supports both business models (billing for each metered event and Internet-style "all you can eat") so any vendor of Teleportal products or Teleportal services may generate revenues and profits no matter what type of business model they use. Thus the TPUTPU can separate itself from the different strategies of optimized networks and the Internet, support both of them, or evolve in its own ways as a parallel infrastructure that can remain effective whether these networks coexist or any one type of network becomes dominant.

To make this possible, the TPU introduces innovations on its Partners/Supply-Chain/Services Ecosystem 6408 in FIG. 135. These are described by means of two figures: FIG. 188 "Classic Competition vs TP Friendition" illustrates the difference between today's product competition/platform-level competition and Teleportaling's approach to providing infrastructure-level benefits across multiple platforms, vendors, customers, devices, services, markets, etc. (Note that this does not violate monopoly laws because there are established business models of the TP's type such as OEMs [Original Equipment Manufacturers] and white label vendors [companies that provide services to vendors that they resell], and in addition Teleportals are an entirely new type of devices and systems, so this has no monopoly and is dwarfed by every category of product, technology, company, etc.). FIG. 189 "Global Ecosystem Process" illustrates how vendors can provide products and services by means of the Teleportal infrastructure. It also illustrates how TP customers can create TP products and TP services that they can in turn market and sell worldwide by means of the TPU infrastructure. This ecosystem combined with TP communications provides an explicit engine for accelerating worldwide innovation and benefits based upon creation and diffusion of productive new ideas from more sources.

Classic competition vs TP "Friendition": The TP's ecosystem/partnering/supply chain innovation is explained and illustrated first by turning to FIG. 188 "Classic Competition vs TP 'Friendition'" some examples 9320 are shown of current platform-level competition, and there is both brand level and product level competition that exists within each platform:

PC—Hardware/Software/Internet 9321: This includes hardware products from companies like Apple, HP and Dell. It also includes boxed software and network-based software from companies like Adobe, Google and Microsoft. Finally, it includes the Internet since PC's and laptops are the most frequently used devices for accessing and using the Internet. This platform also competes with the other two platforms in this illustration: PC platform versus telephone platform 9324: By means of the Internet, PC's can make VOIP telephone calls. Similarly, mobile phones can be used to access the Internet. In some parts of the world mobile phones are the most frequently used device to access the Internet. There is also a continuing evolution of mobile phone devices that are designed so that they include more Internet capabilities (such as PDAs with slightly larger screens and full keyboards). PC platform versus television platform 9325: By means of the Internet, PC's can watch television shows and other types of streaming video. In addition, PC's can be used to create video, as well as host and broadcast video. Increasingly, new television products include Internet access and hybrid Internet/television capabilities. With Internet access, televisions can be used for activities such as Web browsing, e-commerce, and music streaming. With hybrid Internet/television features, digital set-top boxes can be used to download and store movies and other entertainment content that can be accessed and delivered via the Internet.

Telephone—Mobile/Landline/VOIP (Voice over IP) 9322: This includes the mobile phone vendors and landline RBOCs (Regional Bell Operating Companies) such as BellSouth, Qwest, AT&T and Verizon. It also includes VOIP vendors such as Vonage and Comcast (whose Digital Voice product has made this company the fourth largest residential phone service provider in the United States). The mobile phone vendors also sell hardware since they force cell phone manufacturers to lock every device to one network so that the mobile phone network vendor can sell its by contractual role relationships that lock customers into long-term contracts, cell phone pricing structures, and payment for every service. This platform also competes with the other two platforms in this illustration: Telephone platform versus PC platform 9324: This is the same cross-platform competition that was described above in "PC platform versus telephone platform 9324." Telephone platform versus television platform 9326: By means of their optimized networks and the Internet, telephone vendors are starting to deliver television services as part of selling a "triple play" of voice, data and video (which includes the equivalent of cable television subscriptions). Similarly, television platform vendors also sell the same "triple play" to their subscribers which includes a full range of voice, data and video.

Television—Cable/Satellite/Internet 9323: this includes the cable television and satellite TV vendors such as Comcast, Time Warner, Cox, DirectTV and Dish Network. These typically offer the "triple play" of voice, data and video (television) and have gained a lot of market share as both Internet service providers (ISP) and digital telephone service vendors. In some examples cable companies and VOIP service providers added nearly 15 million residential subscribers in the three years starting in 2005, while RBOCs lost over 17 million lines during the same period. In some examples Comcast has become the United States' largest cable-television company, its second-largest ISP and the fourth largest telephone service provider. Television platform versus telephone platform 9326: This is the same cross-platform competition that was described above in "Telephone platform versus television platform 9326." Television platform versus PC platform 9325: This is the same cross-platform competition that was described above in "PC platform versus television platform 9325."

There is also a combined overlap 9327 where all some of these platforms (in some examples telephone, television, PC) compete or collude, depending on one's interpretation of current technical evolution and/or political lobbying. This is due to the technical fact that on all of these platforms a bit is a bit and every type of application can be carried over the Internet (including every service sold by every telephone network vendor or every television network vendor). The cable, telephone and telecommunications industries are lobbying government for control over the Internet. If granted, vendors could use "deep packet inspection" to determine every Internet action by every customer (such as every cable modem user, and every DSL modem user) and then integrate every user's profile and each Internet activity with their billing systems. Therefore, vendors from one or more of these platforms may convert the open and free Internet into the equivalent of a cell phone network—where every currently free action (such as e-mail) could be priced (such as the current twenty-cents for every SMS text message not on a service plan), or every downloaded YouTube video could be priced at twenty-five cents, like some current cell phone charges for emailing a small digital photograph. On the other side of the argument, if sending every email cost one cent then most people would spend only pennies per day while spammers would not be able to afford to flood inboxes with spam.

In contrast to this inter-company business "competition" and inter-platform "competition," Teleportal "Friendition" 9330 illustrates how the Teleportal takes a meta-perspective on these platform and product competitors—whether they are optimized networks (such as landline telephones 9332, mobile telephones 9332, cable/satellite television 9333, etc.), other platforms such as Microsoft's "monopoly-like" market power (Windows PCs, Windows application software, Windows servers) 9331, the Internet 9331 9332 9333, and/or customers who the TPU enables as participants in expanding their options 9334. The TPU infrastructure is agonistic and provides financial revenues, integration and support to a plurality of platforms, vendors, customers and/or what they sell or provide, such as in some examples as illustrated in FIGS. 190 and 191.

The TPU is able to practice agnostic "Friendition" 9330 with various types of platforms because it changes the relationship between a company, its products and its customers—a parallel evolution to recent historic changes that have taken place between global corporations and nation states—like Toyota and Japan, BP and Great Britain, or General Motors and the USA. Historically, these types of industry-leading firms were linked to a country and each company was considered to have a fixed national identity that included location of its corporate headquarters, primary stock exchange registration and where most of its senior managers were born and educated. Recently however, a growing number of firms have "unbundled" their national identities as defined by re-locating their headquarters to one or more new countries, changing their financial and legal home to more advantageous countries, globalizing their acquisition of leadership and talent, etc. Some examples include Rupert Murdoch's News Corporation's move from Australia to America, Ingersoll Rand and others who left the United States for Bermuda's favorable tax rates, Israeli technology companies who re-make themselves into subsidiaries of newly-created US parent companies to secure US contracts and financing, etc. For another example as of 1997 over 3200 companies worldwide were listed on stock exchanges outside of their home country, including direct listings and depositary receipts.

Similarly, this Teleportal Utility focuses more on its larger economic and human innovation of helping make the world into one successful room, with benefits for both corporations and customers, compared to the narrower corporate goal of creating wholly owned TP products that defeat or replace those companies' products and media channels in the marketplace, while at the same time "capturing" and "owning" large markets of customers. To include this ecosystem/partnering/supply chain innovation, the TPU consciously redefines "competition" (the win-lose battle where two or more companies compete to gain market share, and every victory by one company is at the expense of its competitors) into "Friendition" which is a win-win relationship in which Teleportaling and the Teleportal infrastructure is agnostic about companies, networks, technologies and platforms and can work openly with companies that compete with each other to provide humanity with broad benefits by means of a growing range of communications products and services that operate together across a common TP infrastructure, even if these companies employ different business models, technologies and platforms. This agnostic relationship 9330 might also deliver larger revenues and profits for the companies who include the TPU as part of what they sell since they can deliver new TP products and services and earn both revenues and profits from them.

Ideally, a plurality of platforms and networks should be able to operate simultaneously and in parallel. There has always been price differentiation between different products, even from the same vendor (such as service packages or products priced at levels like "gold, silver, and basic"). TP agnostic "Friendition" 9330 is also designed to support more technology diversity and less monopoly, which also provide benefits such as innovation, productivity and growth. But whether different types of networks flourish or one type of platform wins decisively and dominates, the TPU infrastructure is designed to support it and provide it the revenues it seeks on its terms.

Ecosystem process: To demonstrate an instantiation of "TP Friendition," turn now to FIG. 189 "Global Ecosystem Process." This ecosystem process, combined with communications between the TPU 9380, TP vendors 9356 and/or TP customers 9357 provides an explicit engine for accelerating innovation and benefits based upon creation and diffusion of new capabilities and ideas. Said FIG. 189 illustrates how multiple vendors 9356 of multiple competing platforms 9356 9321 9322 9323, as well as TP customers 9357 9358, may create and provide TP products 9367, services 9367, etc. over the TP infrastructure 9360, and can make a combined contribution to humanity's improvement through "Friendition" even though they are otherwise competitors with some examples including PC Hardware/Software/Internet 9321 in FIG. 188; Telephone: Mobile/Landline/VOIP (Voice over IP over the Internet) 9322; Television: Cable/Satellite/Internet 9323; Which may also include TP customers 9357 9358 9356.

In the planning and development process 9372 vendors 9356 and/or customers 9357 9358 9356 create a product, service, network, application, etc. for sale or for free use 9363. To do this they can access Virtual Repositories 9362 to employ reusable components such as templates, APIs (Application Programming Interfaces), etc. Said reusable components 9362 may include elements from reusable TP resources such as the Virtual Repository 9306 in FIG. 186 which may provide elements such as: Templates (layouts); Designs (appearance); Patterns (functions); Portlets (components); Widgets (components); Servlets (components); Applications (features like presence, sharing or speech recognition); APIs (Application Programmer Interfaces); Etc.

After development 9363 said components from virtual repositories 9362 may be improved during the development process 9363. These improved components may be optionally returned to, or deposited in, said virtual repositories 9362 as publicly accessible components, designs, etc. for others to use in their new designs 9363, fostering a virtuous cycle of continuous improvement. Alternatively, any legal means may be used to keep said improvements proprietary, confidential and/or protected by utilizing any intellectual property means that is legal and appropriate for each type of component utilized during development.

At an appropriate development stage(s) and optional or required, TP authorization 9364 may be provided as (1) a free service, (2) an automated testing tool or testing process, (3) a manual consulting service, (4) a paid certification requirement, or (5) another type of authorization process before adding said new product or component to the TPU infrastructure 9360. Once TP authorization is granted 9364 if required, or when said new TP product or TP service 9363 is completed if TP authorization 9364 is optional, it may be installed and provisioned on the TP network 9365. Once installed and provisioned 9365 it may then be used 9370 9371 by authorized customers and users 9357.

For customers to buy and use 9366 said TP product 9367 or TP service 9367 it may be published for purchase or for free use 9361. The publishing process may include accessing Virtual Repositories 9362 to employ reusable components such as templates, guides, portlets, widgets, etc. Said published items 9361 are listed in various means as available TP products and TP services 9367, so that they may be found and chosen 9367 by current and/or potential TP customers 9357. If said components 9362 are improved during the publication process, then said improved components may be added to said virtual repositories 9362 to provide those improvements widely. In addition, said TP products 9367 and TP services 9367 may be marketed by any non-TP means such as advertising in other media or direct communications between a company and its customers or prospects. Once found and chosen 9367 said TP products and/or TP services are bought or ordered 9368 by said customers or prospects 9357. After said purchase or ordering 9368 said products and/or services are provisioned and installed 9369, which also includes updating said customers profile 9359 so that said customer 9357 may use said TP services, TP products and/or TP network(s) 9370 9371.

Said FIG. 189 also illustrates the process by which TP customers 9357 9358 9356 can create TP products and TP services 9363 9362 9364 9365 9371 9361 9367 for sale or free use by means of the TPU infrastructure. By including and combining various reusable TP services that are accessible by online means such as templates, APIs, components 9362 and/or a TP Virtual Repository 9306 in FIG. 186, customers may create and add to the TP Network innovative TP services or copied TP services (such as functional copies of others' TP services that are passed on by downloading functioning templates 9362) such as:

Public broadcasts and broadcast networks 9358: A new public broadcast network 9358 may be introduced by using broadcaster tools and templates 9362, archived content from any (legal) sources, or individually created content for broadcasts 9358. In some examples such as sports, some examples include broadcasts of a popular local sports event that commercial media channels don't broadcast. In some examples a college may develop a local sports network for its other sports such as volleyball, lacrosse, track and field, swimming, wrestling, etc. In some examples a set of broadcast networks may cover local high school and/or college intramural sports. In each case these types of broadcasts would show sports events that are not currently broadcast by commercial media—in fact, many of these sports events are not even covered by commercial media's sports news.

Private individual broadcasts 9358: Live or archived (legal) content may be privately broadcast with access restricted to one's self, family and/or friends 9358. In some examples is to create "safe" broadcast networks that eliminate the multitude of shows that are destructive of children's values and morals. One or a plurality of private broadcast networks may be created by recording one's paid-for cable television shows then rebroadcasting those at days and times that are more convenient for a family's viewing than the original broadcast schedule. This could enable a personally constructed broadcast channel that filters out what an audience considers harmful television content so that "safe" broadcast networks are made available. Entire filtered broadcast networks could be run and made available for others to view, download, tweak and apply (including filled schedule templates, recording and playback code, etc.).

Global television viewing 9358: Individual TP customers (whether corporations or individuals) could use their TP devices and TP services to access and re-broadcast archived or currently broadcast television shows (such as via a cable TV set-top box). These new television broadcast channels could be publicly available or a private resource for one's self, family and/or friends. To obtain high quality content in some examples vendors of "safe" entertainment content could make certain shows available for free rebroadcast (with commercial advertising included). Those shows' ad revenues would flow directly to the content vendors, so that these personally created broadcast networks assist in distributing their shows and earning them revenues directly. Some popular niche shows could gain entirely new revenue sources and audiences, such as an "I Love Lucy Network," a "Baywatch Network" or a "Mickey Mouse Club Network" could provide those shows' owners with new advertising and/or content revenues.

Public or private PC computing power 9358: Making your PC's and their software available as online resources 9358 (whether publicly to any user, or as private resources for one's self, family, friends, and/or co-workers). In some examples a plurality of households have a growing number of slightly older PC's with perfectly useful recent versions MS Office software that could be used remotely by others who need those types of software. These could be accessed by means of independent groups that provide PC use, applications, storage, or other PC resources free to valid users such as needy students in developing countries, public service projects such as medical research into proteins, or non-profit charities that need but can't afford more computers; rent PC usage online; etc.

Remote controlling your TP devices 9358: Use your TP devices remotely (such as your LTP for international TP Shared Space(s) or collaboration at any time, PC's as always-available resources, cable or satellite television viewing, etc.), whether publicly available or as private resources for one's self, family and/or friends.

Digital content libraries 9358: Collections of (legal) digital content and media can be put online (such as on slightly older PC's) for use by others, whether as publicly available resources, or for private entertainment and use by one's self, family and/or friends.

Virtual repositories 9362 and 9306 in FIG. 186: Once each new type of TP service is developed then its templates, APIs, portlets, designs, interfaces, etc. may be posted online in TP virtual repositories 9362 for others to use by copying and adapting these 9363 for similar or new purposes. Then customers 9357 can decide what they would like to do 9358 and become creators of new TP services 9357 9358 9356 9363 9364 9365 that they then keep for their own private use, publish for purchase 9361 9367, publish for free use by others 9361 9367, etc. Blogging provides some examples of how this has worked before with a different technology. Once blog creation services with template repositories and accessible widgets and tools were online millions of users could set up and run their own blogs. Similarly, TP applications and services 9358 9367 9368 9370 may be set up and run by a plurality of TP customers 9357, including scaling the popular ones to being provided by growing numbers of TP customers.

Updating to new versions 9363: At any time said TP vendors 9356 and/or TP customers 9358 9356 may update their TP products and/or TP services 9363 9364 9365 9361 9367. This may be done because new downloadable improvements become available and accessible such as updated and improved APIs 9362. It may also be done because improved templates and components are available 9362 (in some examples new designs for broadcast networks 9358 9362) that may be adapted by one to a plurality of TP customers or users 9357 9358 9356.

Third-party systems (BSS/OSS) (6406): TP Information Exchanges: Telecommunications network operators use Business Support Systems (BSS) and Operations Support Systems (OSS) to run their businesses (BSS) and operate their networks (OSS). Generally, a BSS provides processes such as product and customer management, ordering, and revenue management. An OSS typically provides processes such as provisioning devices and services, configuring various parts of the network, and managing errors or faults. As illustrated in FIG. 190, "TP Information Exchange," in the Teleportal Utility (TPU), the BSS/OSS layer 6406 in FIG. 135 provides for information exchange between the TPU 9387 and TP vendors 9385 who have TP customers (e.g., vendors who sell TP products and TP services). It also includes data integration between the TPU 9387 and TP customers 9386 who use their TP devices and TP services to provide free or paid services (that they sell) to other TP users. This process allows each TP vendor 9385 and/or TP customer 9386 to set their own prices (including "free") for each TP product and/or TP service that it provides. It also allows them to utilize TPU 9387 billing, invoicing and payment systems for any portion of its customers that it wants and receive the revenues from the TPU 9387. Thus, a plurality of types of TP vendors 9385 and TP customers 9386 are supported financially at the same time, by said information exchange processes, including both optimized network vendors and Internet vendors, as provided in more detail elsewhere.

Integrated Data and Revenue Flows: Turning now to FIG. 191 "Integrated Data and Revenue Flows" this illustrates the flow of revenues and data that support both optimized networks (such as mobile phone networks and/or cable television networks), Internet-like businesses (with varying models from free to "all you can eat" subscribers to paying for each individual item), and customers who post free services or paid TP services and/or resources (that they give away or sell)—so that each TP vendor and/or TP customer may establish pricing and/or marketing for each product and service as he or she chooses. Said process begins as TP vendors 9335 9336 (which may include corporations, TP customers, TP partners, etc.) request TP data and revenues: Automated acquisition of TP data and/or TP revenues: In this process vendor applications 9339, vendor developers 9340 vendor end users 9342, and/or vendor LTP users 9341 or vendor MTP users 9341 may initiate or run a TP shared service 9344 that retrieves appropriate TP data and/or revenues from the TPU 9343. Manual acquisition of TP data and/or TP revenues: In this process vendor developers 9340, vendor end users 9342, and/or vendor LTP users 9341 or vendor MTP users 9341 may utilize the TP business portal 9345 to request TP data and/or revenues from the TPU 9343. Manual updating of TP data in TP customer records: In this process, which may occur in some examples when a TP customer enters a TP Shared Space to connect with support from a TP vendor, vendor developers 9340, vendor end users 9342, and/or vendor LTP users 9341 or vendor MTP users 9341 may utilize the TP business portal 9345 to request TP data and/or revenues from the TPU 9343, display it, and edit or update said customer's data.

Within the TPU 9343 both types of requests (automated by means of TP shared services 9344 and manual by means of TP's business portal 9345) the first step is security by means of said TP Security/Authentication/Authorization Service 9346, addressed elsewhere such as 9005 in FIG. 165. After authorization 9346, said request for TP data is received 9353 and either of two appropriate services or processes are provided:

If TP data only is requested: When (1) vendors want to set their own prices and do their own customer billing, and/or (2) when vendors and/or customers post free services and want data for other purposes such as capacity planning or user communications (such as marketing), then: Said authorized request 9353 is passed to the TP Data Service 9349 which retrieves the appropriate requested data such as customer data 9350, metered transactions by those customers 9351, and any other data requested 9352 such as data on TP devices used by that customer. Said TP Data Service 9349 is described and addressed above such as 620 in FIG. 138. Said gathered TP data from TP Data Service 9349 is returned to said external requestor 9347 9339 9340 9341 9342 by the appropriate means for said request (whether by means of said TP shared services 9344 or TP's business portal 9345).

If TP data and/or TP revenues are requested: When (1) vendors want to track their customers and their revenues, and/or (2) when vendors and/or customers post revenue-generating services and want said TPU's billing services to invoice customers and transfer revenues received, then: Said authorized request 9353 is passed to TP's billing workflows 9348 (described and addressed above such as 9010 in FIG. 165). At the appropriate periodic interval for TP billing and invoicing, said TP billing workflows 9348 acquire appropriate customer data from said TP Data Service 9349 which retrieves the appropriate requested data such as customer data 9350, metered transactions by those customers 9351, and any other data required 9352 for said billing workflows (such as data on TP devices used by that customer). After TP billing workflows are completed 9348 the appropriate data and revenues 9347 are available for both (1) automated periodic transmission to said vendor 9336, and/or (2) available for the appropriate data and/or revenues to be transmitted by request to said external requestors 9347. Said TP data and revenues is returned to said external requestor 9347 9339 9340 9341 9342 by the appropriate means for said request (whether by means of said TP shared services 9344 or TP's business portal 9345, and/or financial payments).

If TP data needs to be edited or manually updated: When a TP vendor wants to manually edit or update their TP customers' data, then: Said authorized request 9353 is passed to the TP Data Service 9349 which retrieves the appropriate requested data such as customer data 9350, metered transactions by those customers 9351, and any other data requested 9352 such as data on TP devices used by that customer. Said gathered TP data from TP Data Service 9349 is returned to said external requestor 9347 9339 9340 9341 9342 by the appropriate means for said request (whether by means of said TP shared services 9344 or TP's business portal 9345). If required by the TP vendor's relationship with their customer, TP vendor may edit or update said TP customer's data by means of a local BSS screen 9339 9340 9341 9342, which then passes said edit or update to the TPU 9344 9345 to update said customer's record(s) by means of said TP Data Service 9349.

Upon receipt said vendor 9336 may input said TP data to the vendor's billing system 9353 9355 and/or other business workflows 9353 such as other types of user communications 9356. To meet its own business practices each vendor may generate said invoices 9355 by utilizing said vendor's unique prices 9354 that it sets for each TP activity performed by its customers. By means of this "Integrated Data and Revenue Flows" FIG. 190, optimized networks are enabled in continuing to charge 20-cents for a single small SMS text message in only one country or geographic region, while Internet-like businesses can continue to provide worldwide email with multi-megabyte attachments for free to their customers. The result is that a TPU remains agnostic and supportive of these or any other business models.

Innovation infrastructure for new TP networks, devices, services, applications, etc. (6404): FIG. 192 "Infrastructure for New TP Innovation (Technologies, Networks, Devices, Hardware, Services, Applications, Etc.)" provides means for adding new communication capabilities across the TPU infrastructure 9380 9381. Some examples of this expanding future include e-paper, mobile teleportal devices, pocket teleportal devices such as wearable glasses or interactive projectors, various networks for areas like lifetime education or travel, alert systems for areas like business events or celebrity sightings, personal device awareness for personal deliveries to one's currently active device, etc. Some examples (of many more possible) used herein as illustrations include: New TP technologies and/or devices 9376 (such as E-paper which has the potential to provide global access to a plurality of types of visual [non-audio] content that could be accessed by means of the TPU infrastructure); New TP networks 9375 (such as an education network, which has the potential to provide access to a plurality of types of exemplary education resources, courses, teachers, classes, etc.); New TP services 9378: Presence awareness for communications (such as public presence for various types of contacts and messaging, private presence for personal deliveries of information and entertainment via one's current connected devices); New TP accessories or peripherals 9377 (such as new types of peripherals such as wireless 3D selection devices, wireless headsets, augmented information display "glasses," etc.).

For TPU development 9380 9381: Utilize development processes enumerated herein such as FIG. 189 "Global Ecosystem Process" and FIG. 186 "TP Interface Components Process," as well as development processes in use outside of this. During development utilize reusable TP resources such as Virtual Repositories 9362 in FIG. 189; TP Interface Improvement Service 9320 and Virtual Repository 9306 in FIG. 186; and TP Built Services 9044 9045, TP Bought Services 9046 9047, Third-party TP Services 9048 9049, and Third-party TP "In the Cloud" Services 9048 9050 in FIG. 176; etc.; as well as reusable resources available from other sources.

When developed, save to the appropriate virtual repository (ies) 9382: If developed by the TPU and/or a vendor or customer who wants to provide reusable tools or resources to the TPU 9383: Save reusable code, UIs, portlets, widgets, APIs, downloadable drivers, etc. to an accessible virtual repository 9383. If developed by a private third party vendor and/or customer who wants to keep private said reusable components and downloadable drivers 9382: Save reusable code, UIs, portlets, widgets, APIs, downloadable drivers, etc. to a private and proprietary virtual repository 9383. If developed by a private third party vendor and/or customer who wants to keep some components private while making downloadable elements (such as drivers) publicly available 9383 9384: Save private elements such as code, UIs, portlets, widgets, APIs, etc. to a private and proprietary virtual repository 9384, while providing downloadable elements (such as drivers) to an accessible virtual repository 9383.

ACTIVE KNOWLEDGE MACHINE (AKM): The Active Knowledge Machine (hereinafter AKM) component relates generally to human knowledge that is automatically delivered to and/or requested by remote users during and after the performance of steps and tasks to raise the success and satisfaction of those activities during the use of "devices" (which are defined as both physical and digital such as products, equipment, services, applications, information, entertainment, education, etc.). This new AKM provides a simultaneous transformation and integration of knowledge into "Active Knowledge Instructions" (herein AKI) and/or "Active Knowledge" (herein AK) into a dynamic and interactive state that may raise productivity, outcomes and results which may have an additive impact on economic growth, human welfare and happiness. Generally, this relates to knowledge that is applied to performing tasks and/or achieving goals, and to delivering appropriate knowledge during and after the actual performance of a plurality of tasks and steps to render devices (such as products, equipment, services, applications, information, entertainment, etc.) more useful and goals achievement more successful.

In some examples a simple high-level comparison is that Google, the search service, describes one of its missions as to organize the world's information. The AKM provides a next generation model beyond organizing (and in some examples includes a marketing and sales channel in a similar commercial extension to Google's main source of revenue). The AKM expands the historic knowledge paradigm FROM "static knowledge you have to find and figure out" TO knowledge that finds and fits its users, with new channels designed to provide the knowledge needed, when and where it is needed—and in some examples with the best alternative(s) for succeeding in a user's goal, and in some examples with appropriate commercial option(s) based on current use—so it also expands the current marketing paradigm FROM push (finding customers selling)/pull (seeking and buying) TO doing (best options or relevant options are a built-in part of tasks). In some examples this accelerates the rate of advances to one or a plurality of individuals (in some examples at scale) who are delivered the know-how and choices to "leap ahead" to the current "best practice(s)" as a normal part of everyday tasks.

Background: This Active Knowledge Machine (hereinafter AKM) redefines R&D (Research & Development) as RD&U: Research, Development & USE. Until now a fundamental problem with human knowledge (which includes text, information, documents, images, video, interactive media and other formats) is that it is static and stored. To be useful and have value a potential user must recognize a need for knowledge, search for it, gain access to the resource that contains it, recognize the right knowledge that applies to that need or situation, obtain it, understand it, and then use it successfully. Two traditional illustrations include looking up a word in a dictionary, or looking up a subject in an encyclopedia, though those may not help make an actual task or step more successful during the use of a "device" (here a "device" is defined as both physical and digital constructs such as products, equipment, services, applications, information, entertainment, etc.). In some examples the World Wide Web contains an enormous quantity of knowledge (including media and multiple sources and forms of knowledge), but the Web does not provide utility until someone goes to the Web with a browser, finds the right website, then the right web page on that website, then the right part(s) of that web page, then analyzes and comprehends that information, then figures out how to use or enjoy that part of that web page, and then applies it successfully. Interactive media on a wireless device such as a smart phone may be an application that does lookups such as for foods' nutrition information like calories and/or nutrients: That narrow "calorie counting" application must be bought, learned and then run again each time one eats, to look up the calories and other nutritional values for each food eaten (which is a very complex process when recipes include multiple foods whose quantities are each highly varied because of different serving portion sizes).

Clearly, while knowledge has enormous value it also has enormous problems with realizing that value worldwide. In the world's current R&D model, the Research stage is described by Paul Romer's seminal advance in economic theory ("Endogenous Technological Change," 1990). This contemporary economic growth model now includes accelerating technological change, intellectual property and monopoly rents. It rewrote the old proverb from "give a man a fish and you feed him for today, but teach a man to fish and you feed him for a lifetime" to the modern "reinvent fishing and the world might feed itself." In Romer's reformulation, new knowledge is a main driver of economic growth and human welfare: Invent a new means of large-scale ocean fishing, invent fish farming, make fish farming more efficient and healthier, improve refrigeration throughout the fish distribution chain, use genetic engineering to change fish, control overfishing of the oceans, build hatcheries to multiply fish populations, or invent other ways to improve fishing that have never been considered before.

But research that creates innovations is only the "R" component of "R&D;" by itself it is not enough to produce economic growth and raise human welfare. Economic growth research by Dr. Diego Comin at Harvard Business School has calculated that the cross-country variation in the rate of technology adoption appears to account for at least one fourth of per capita income differences (see Comin et al, 2007 and 2008). That is, when different countries adopt new technologies at different rates, those that are better at adoption see economic growth because their level of productivity and performance are raised to the level of the newer technologies. (citation: see the two Comin papers cited on page 18 above).

But even where both Research and Development exist, they too often fail to deliver all or part of their value. USE is the unsolved problem, because the how-to knowledge that end-users need to succeed when they USE new innovations remains scarce during the task, time and place needed. In some examples a plurality of everyday technologies have higher failure rates than is commonly assumed, and need more knowledge than many users possess. A research study by the Pew Internet & American Life Project, "When Technology Fails," found that almost "half (48%) of tech users need help from others in getting new devices and services to work . . . . Coping with these failures is a hassle for many tech users and helps to distance them from technology use." In brief, the following rates of failure (defined by this research as complete breakdowns during the past 12 months) were reported: Home Internet connection: 44%; Desktop or laptop computer: 39%; Cell phone: 29%; Blackberry, Palm Pilot, or other PDA: 26%; iPod or MP3 player: 15%.

Similarly, another research study found that 11% to 20% of consumer electronic devices sold are returned, and more than two thirds (68%) of those returned devices are not defective. In "Big Trouble with 'No Trouble Found' Returns," a research study from Accenture, a worldwide consultancy, it was reported that "Results from a recent Accenture study have uncovered surprisingly large, unrecognized opportunities for manufacturers and retailers across the value chain . . . . In the consumer electronics industry, which includes devices sold by communication carriers and electronics retailers, Accenture estimates that the average return rate for devices ranges from 11 to 20 percent. Of these, more than two thirds (68 percent) can be characterized as 'No Trouble Found'." Use was also pinpointed as a problem in research by Wharton School Professor Robert J. Meyer and colleagues: The "paradox of enhancement" explains that customer purchase decisions are driven by new and improved features, but after acquisition the new owners use primarily basic features because they are overwhelmed by the complexity and learning required by the new features.

To all of the above, this adds "Use" to R&D, forming a new Research, Development & Use model (hereinafter RD&U) that completes the cycle required to produce greater value to actual users and vendors from today's pace and scope of R&D innovation. This new RD&U stage, "Use," stems from the gap between the potential value of R&D for economic growth and human welfare, because it does not realize enough of its potential to spread and deliver DURING USE the value for which each new technology, product, feature, etc. was created. The "Active Knowledge Machine" may expand "Use" by connecting the new R&D knowledge created and behind these advances with use, so that "RD&U" may actually deliver more of the value those advances were intended to yield.

Today humanity must turn to new R&D advances to confront overwhelming problems such as energy, raw materials, aging populations, health care, climate change, sustainability, and other needs and problems. But many advances from our growing blizzard of R&D will fail if "static knowledge" remains how those innovations are spread and used worldwide. The "use" stage will be an obstacle that stops a plurality of advances from helping solve the problems for which they are needed and created.

At this time there are continuous dramatic cost decreases, along with speed and capacity increases in Global networking (both wired and wireless, and both private and public); Computing (such as data centers, servers, storage, computers, laptops, netbooks, PDAs, smart phones, virtualization, etc.); Applications (such as web services, web applications, standardized APIs, enterprise systems, service oriented architectures, BSS/OSS systems, membership/subscriber systems, etc.); Advances in devices (such as new types of devices, new features in existing devices, user interfaces, communications, added features such as built-in cameras, storage, the ability to set devices remotely, etc.); Along with other technological improvements that have opened up applications for integrations of these communications, computing, applications, devices, etc.

One such application is the delivery of "active knowledge," which technique delivers to a user, during and after the Use of devices, the knowledge needed to succeed in achieving various goals that include the successful use of said devices. This technique can be useful in providing remote users with the knowledge needed to succeed in a step, in a task, or in achieving a larger goal—while said process is scalable to serve a multiplicity of steps, goals, devices and remote users.

Thus, this AKM (Active Knowledge Machine) may transform "static knowledge" by giving it a scalable capacity to improve our individual and collective lives one step at a time, one use at a time, and/or one activity at a time. Its advance is new ways to increase the usefulness of knowledge by creating dynamic connections between needs and appropriate knowledge resources. There may be better ways to do things, but this AKM is for delivering (optionally optimized) knowledge to a plurality of individuals who need it at a plurality of times and places needed. Compared to the "static knowledge" in physical repositories and most websites that is not available when and where needed, converting appropriate, needed knowledge into this new type of "Active Knowledge" might be an input in our increasingly knowledge-based economies that may help drive the production of actual outputs: RD&U may raise the results and value from R&D. If RD&U were an everyday part of today's value chains, it might help improve situations, results and outcomes to produce more of the economic growth, human welfare and happiness we desire, as well as deliver more value from the advances created to help meet humanity's needs.

Summary: It is an object of the "Active Knowledge Machine" (hereinafter AKM) to introduce a new paradigm for human knowledge whereby one format of human knowledge becomes a dynamic, interactive resource ("Active Knowledge," hereinafter AK) that can increase productivity, wealth, welfare and success of individuals (and by means of scaling, of groups and societies).

It is another object of the AKM for AK to transform a plurality of kinds of products, equipment, services, applications, information, entertainment, etc. into "AKM Devices" (hereinafter "devices") that are parts of, related to or served by one or more AKMs (Active Knowledge Machines). Said devices are integrated as AKM components by means of transforming operations within AKM(s) that deliver "Active Knowledge Instructions" (hereinafter AKI) and other types of Active Knowledge (hereinafter AK) to the point of need, including a user's preferred device(s) and format(s).

FIG. 193: A further object of this AKM is to provide AKI and AK to anonymous users during the use of devices, so that their privacy is maintained. (7102 in FIG. 193) A further object of this AKM is to provide AKI and AK to identified, authenticated and/or authorized users during the use of devices, so that said users' profile may be accessed, their online presence determined, their current Devices In Use (hereinafter DIU) determined, and the appropriate AKI and AK may be delivered to said user's preferred, available device or AID/AOD (Alternative Input Device/Alternative Output Device). (7104-7112 in FIG. 193). A further object of this AKM is to access Active Knowledge Resources (hereinafter AKR), which may be stored in various AK databases and other storage in various locations, to obtain AKI and AK for delivery to anonymous and/or identified users. (7114-7117 in FIG. 193)

FIG. 194: Still other objects of the AKM are apparent from the specification and are achieved by means of: Devices and/or users make and AK request from the AKM by means of trigger events in the use of devices, or by a user making a request. (7120 in FIG. 194); The AKM receives the AK request, parses it, determines the AKI and AK needed, and retrieves those from the AKR (Active Knowledge Resources). (7124 in FIG. 194); The AKM determines the receiving device, formats the AKI and AK content for that device, then sends it to said receiving device (7130 in FIG. 194); The AKM determines the result by receiving an (optional) response; if not successful the AKM may repeat the process for and at either the user's, device's or AKM's discretion; or the result received may indicate success; in either case, it logs the event in AK results (raw data). (7130 in FIG. 194); The AKM may utilize said AK results to improve the AKR, AKI and AK content, AK message format, etc. (7138 in FIG. 194); The AKI and AK delivered may include additional content such as advertisements, links to additional AK (such as "best choice" for that type of device, reports or dashboards on a user's or group's performance), etc. (7139 in FIG. 194); One means for generating AKM revenues includes AK sponsor services such as sponsor selections; selected sponsors entering messages, ads, or links; and the appropriate sponsors' communications are included for the AKI and AK delivered. (7140 in FIG. 194); Reporting is by means of standard or custom dashboards, standard or custom reports, etc., and said reporting may be provided to individual users, sponsors (such as advertisers), device vendors, AKM systems that employ AK results data, other external applications that employ AK results data, etc. (7146 in FIG. 194).

FIG. 195: A further object is to employ an AKM interaction engine that includes explicit processes for serving anonymous users and devices (7152 in FIG. 195), and identified users and devices (7164 in FIG. 195). AK may be provided to anonymous users and devices by receiving a trigger, accessing AKR (AK Resources) to obtain appropriate AK content, links, ads, subscription offers, etc.) and delivering that so that said anonymous user may employ said AKI and then (optionally) act on the additional AK or ads provided. Similarly, AK may be provided to identified users and devices by the same process, but additionally including more options from said identified user's profile such as delivering said AK to said user's preferred receiving device(s) that are currently online and available; analyzing said identified user's performance as a result of using the AKI and AK delivered, and if needed escalating said AK delivered; etc. Receiving results is optional, but if received said results may include the use of AKI, AK, ads, best choice options, links, subscriptions, reports, etc. and these may be logged from both anonymous users and identified users.

FIG. 196: A further object is to provide additional AKM services to identified users such as customized deliveries of AKI and AK based on their current use of alternative devices (AIDs/AODs, which are Alternative Input Devices/Alternative Output Devices); individual analyses of their performance to supply appropriate additional AKI, AK, reports, links, etc.; individualized dashboards with gap analyses and links to best available AK and device choices; self-selection of goals; and AKR that supports achievement of said self-selected goals; etc.

FIG. 197: A variety of data are included in AKR (AK Resources) but in general these are mapped to actual real-world uses so that the AKR storage may be accessed by means of known and frequently utilized techniques. In some examples is a barcode identifier, and in some examples is the usage lifecycle depicted in FIG. 197. FIG. 198-199: The method of providing AKI and AK may further include performance analysis and escalation as illustrated in FIG. 198. said performance analysis may also include setting a performance status indicator as illustrated in FIG. 199. FIG. 200: A further object is to log the AK provided and/or (optionally returned) results from the use of AKI and AK delivered to users. Said logging occurs for both anonymous users and identified users, but if anonymous only the AK results and subsequent AK-related actions are recorded. If a user is identified, then those are associated with the user's profile and AKM record(s) to enable additional services such as individual performance analysis and AK assistance. FIG. 201: The stored performance record of said identified user may be provided by a personalized AKM data record such as illustrated in FIG. 201.

FIG. 202: AKR (AK Resources) may be accessed by types of events during the use of devices such as by means of a trigger (such as a task failure, task retries, task exit, etc.), or by means of a user request (such as at a task failure/exit, or to obtain an alternate task path, or to obtain an alternate product or service, etc.), or by the need to repeat an AK delivery (such as if the delivered AKI failed, the delivered AKI worked but poorly, the user replies that the AKI is wrong, the user wants alternate to AKI, etc.). In each event appropriate AKI and AK access rules are employed. FIG. 203: In another aspect the AKM may calculate periodic or real-time baseline(s). These may be used in gap analyses for individual interactions or groups/classes of interactions. FIG. 204: The AKM may further include optimizations to select and deliver the best AKI and AK in order to achieve operating goals such as: (1) raising the rate of success of those below a current baseline up to the current standard, (2) attempting to raise the average baseline performance up to the level(s) of the best performers, (3) raising an identified user's individual rate of performance in an area up to the level(s) of the best performers, (4) etc. a compilation of stored baselines maybe processed to show improvement over time, which indicates the cumulative AKM optimization process(es). (7364 in FIG. 204). FIG. 204: The current AKM baseline(s) and gap analyses may be used as part of reporting the visible impact of the AKM, wherein said gaps and comparisons with baselines may be used as indicators or variables in the calculation of various types of contributions from the AKM. (7365 in FIG. 204). FIGS. 205 and 206: As a result, for identified users this AKM may include means for said users to select from a plurality of QOL goals, and at any time view their individual current status, progress to date, progress versus personal goals or progress versus others' achievements towards those goals, or other types of individual and aggregated metrics. Said metrics may be utilized to understand gaps in performance (whether positive or negative gaps), to determine the extent of an individual's progress and performance. Said identified users may keep, delete, add or edit said QOL goals at any time, including components such as AKI and AK delivery devices, priorities, metrics, goals included, targeted results desired, etc. with said user's updated QOL goals criteria stored in said user's organized AKM record(s), which are then utilized for future data gathering, storage and reporting. FIG. 206: When said user(s) edit their AKM QOL goals or options an ambiguity matching service may be utilized to select the correct goal between alternatives, determine if a user's goal is missing and not available, and then provide means for user(s) to add, describe, confirm, etc. a new goal. FIG. 207: The variety of data included in AKR (AK Resources) may be accessed by means of metadata and/or indexes that may be stored separately from various types of AK and AKI content (which may be in formats such as text, instructions, documents, video, audio, etc.), advertising, user AKM record(s), vendor profiles, AK results analyses, etc. Said metadata and indexes may point to and access multiple AK sources from vendors, third parties, competitors, customers, users, etc. FIG. 208: The accessed AKR is formatted into AKI and AK for a device (or optionally an identified user's preferred device) to receive said AKI and AK so that it is displayed properly.

FIG. 209, 210, 211: A further object of the AKM is to integrate a plurality of remote devices via communications with said AKM such that user(s) may receive and act upon said AKI and AK provided by the AKM. This may be accomplished to by means of a decentralized AKM model (FIG. 209), a centralized AKM model (FIG. 210), or a hybrid AKM model with intermediate/transition devices (FIG. 211). FIG. 212: To facilitate said communications new devices may be added and/or updated by means such as new device discovery, establishing communications, validation and/or authentication, and correcting and/or updating attributes such as device identification, communications protocol, or other updates. FIG. 213, 214: The processing of said communications includes processes for both outbound communications (FIG. 213) and inbound communications (FIG. 214) by means that differ based on whether said AKM device operates by decentralized, centralized or hybrid/transition models, also including whether said AKM device can be controlled remotely by "Direct AKI," which is the ability to download pre-set instructions that the device can carry out directly, so the device can cause the user to succeed without the user needing to follow instructions or use AKI/AK. FIG. 215: Devices, users and tasks may be recognized by multiple means that may include multimedia messages (that may contain images, video and/or audio, or that include data such as a combination of media). Some examples include a camera phone's picture of a bar code from a device's label, a camera phone's video of a task such as an attempted exercise on a cable gym, an audio reading of a product's UPC, any request sent from a subscribed user's mobile phone, etc. Said messages may be interpreted for identifying data by known means on the receiving end, and said identifying data may be utilized in said AKI and AK retrieval processes.

FIG. 216: A further object of the AKM is to provide repetitive and efficient means to process a hierarchy of triggers throughout AK interaction(s) that are under user control and may include multiple optional steps: Two of the main types of AK requests include AK requests by a device (7500 in FIG. 216) and AK requests by a user (7506 in FIG. 216); after the resulting AKI and/or AK are received and used (7512 in FIG. 216); then and, optionally, other forms of a.k.a. received may also be used such as AK next step(s) (7518 in FIG. 216), AK best option(s) (7524 in FIG. 216), AK advertising or marketing (7530 in FIG. 216), or other types of AK triggers that provide other types of AK (7536 in FIG. 216). FIG. 217: The processing of said AKM triggers is by active monitoring of a plurality of device(s), user(s) and/or triggers, with said monitoring including error identification, logging and correction. FIGS. 218, 219: One AKM option is for an identified user(s) to manage AKM triggers (7548 in FIG. 218) by means of opening said user's AKM record(s), selecting and editing an accessible trigger(s) (7557, 7560 in FIG. 219), adding or deleting devices and AIDs/AODs (7572 in FIG. 219), etc. FIG. 220: Multiple types of AKM automated alerts may be identified and one or more actions taken and alert services started for either anonymous devices and/or identified users based upon various metrics, such as those described in FIG. 198 "AKM Performance Analysis and Escalation Service(s) ", and in FIG. 199 "AKM Analysis and Comparison Process."

FIG. 221: A further object of the AKM is to assist with improving success and satisfaction by means of various types of public, group and individual reports and dashboards, which may include AK links to other performance data and "best choice" options, along with links to purchase or directly use said "best choice" alternatives. AKM reporting includes a flexible range of metrics and data, including the ability to run a range of reports and dashboards, then modify and save customized version(s) for future use. (7600 in FIG. 221). FIGS. 222, 223, 224, 225: These AKM reports and AKM dashboards may include data, charts, gauges, indicators, tables, scorecards, etc.; as well as complex capabilities such as "best option(s)" choices, dynamic monitoring, alerting, drill down analyses, selective monitoring of metrics or goals, etc. AKM reports serve both anonymous users (FIG. 222) and identified users (FIG. 223); and AKM dashboards also serve both anonymous users (FIG. 224) and identified users (FIG. 225). FIG. 226: Both AKM reports and AKM dashboards may include comparisons and comparative reporting such as to identify, calculate and illustrate gaps between what is already possible and what is currently produced. FIG. 227: So that devices for sale may be improved sooner, with upgraded versions introduced to benefit their users and customers, an additional object of this AKM is to provide vendors with clear AKM reports and dashboards on what they sell. These AKM data may be free or charged depending on each vendor's relationship to an AKM or their other contributions to it.

FIG. 228: It is another object to provide means for continuous improvement in the "Best Active Knowledge" delivered to device users, vendors and others as a normal part of their everyday activities. An optimizations process is provided for users, vendors and others to create or edit AK and AKI, interfaces, templates, etc. with those creations and/or edits tested, validated and optimized as a normal AK process. FIG. 229: With respect to optimizations, a testing "sandbox" is provided that includes: Newly created and/or edited AK and AKI content, new interface designs, appropriate users to include in testing, types of tests to run, automated optimization methods to apply to the results of said sandbox testing, and optimization methods to improve both the test types and the optimization methods. FIGS. 230 and 231: A range of data is available from AKM use and sandbox testing to provide inputs to said optimization methods, including both automated data and user feedback data that users enter manually. Both manual ratings and feedback systems are included to further determine the best optimizations, as well as a method that associates manually entered data with appropriate automatically collected data. FIGS. 232, 233, 234: To create new AKI and AK, to edit existing AKI and AK, to provide new templates and layouts, etc., users, vendors and others may utilize a number of starting points for editing the content or format of said deliveries, or creating improved versions. Said creations and/or edits may be performed using a range of devices, tools, or alternate AIDs/AODs. FIG. 235: Where relevant and appropriate knowledge content is stored outside the AKM, and it is accessible by standard or custom APIs (Application Programming Interfaces), said knowledge content may be accessed, retrieved and delivered by the AKM by means of said APIs. Newly accessible external content may (optionally) be included in the AKM testing sandbox to test, validate and optimize said external content. FIG. 236: During the use of devices users may receive AKI that offers the option of having the AKI directly control the device and performing the Active Knowledge Instructions on behalf of the user. Where devices in use (DIU) may be directly controlled by means of implementing instructions that are delivered from an external resource, and the means for said direct control is by standard or custom APIs, then said means for creating and/or editing said Direct AKI may be provided, for storage in the AKM's AK resources and delivery by the AKM. Newly created or edited "Direct AKI" may (optionally) be included in the AKM testing sandbox to test, validate and optimize said Direct AKI. FIG. 237: Errors may be identified, flagged and corrected automatically or manually with users who encounter the error being notified of the status (corrected or not); and if manual correction is needed users might optionally and conditionally be included in correcting the error.

FIGS. 238, 239, 240: To scale the processes for optimizations, such as for raising success and satisfaction, it is another object to provide means for an optimization ecosystem. In it, data is acquired from a range of AKM sources (FIGS. 238 and 239), "best AK and AKI" is produced by means of AKM optimization processes described elsewhere (such as FIGS. 228-231 and 240), to which are added predictive analytics to determine relative contributions from a variety of AKM processes and content. FIGS. 240 and 241: The optimization ecosystem methods may be employed in to optimize devices in use, tasks, interfaces, vendors' devices that are being improved in development, the AKM's delivered AK and AKI, other AKM and AK communications, etc. Any of those may be selected, prioritized and/or notified as appropriate, such as vendors, third parties, users of devices, sources of AKI and AK, etc. FIG. 242: An aspect of said optimization ecosystem is the calculation of appropriate baselines that are employed in prioritization, notifications, public reporting and dashboards, individual reports and dashboards, etc. such as "total gaps" (between each devices "best" and "worst") and AKM EVA (the AKM's predicted Economic Value Added in each area).

FIG. 243: It is another object of the AKM to provide identified users, vendors, and/or other third-parties with management of users' AKM record(s) including in some examples goals, plans, programs, services, triggers, thresholds, etc. with visible success/failure from said management so that revisions or different selections may be made. In some examples identified users may edit an AKM record of theirs and/or associate a plurality of their AKM records (if they have more than one) within one ID. FIG. 244: Within any one AKM record or associated multiple AKM records, users may select one or more goals which may be derived from a set(s) of stored "best goals" that may be derived from AKM logging of various types of results, or may be developed by a user by means of individual AKM record and goal edits. FIG. 245: Management of user AKM record(s) may be by vendors, third-parties, governances and/or others who sell one or more "goals plans" or "packages" that include associated AKM records and/or AKM services. When solely in the form of AK and AKM services, these may be sold by means such as promotions, campaigns, packaged plans, deals, etc. When these are sold as (optionally, bundles of) products and services with associated AK and AKM services to provide measured and assured levels of customer success, vendor business goals may optionally include selling and replacing some or all of a customer's current products and services to deliver a "bundle" of higher-level lifestyles with associated targeted AKM personal and family achievements and satisfaction. In this case, said products and services packages might also include bundles of products and services such as housing, transportation, financial services, lifestyles, communities, values systems, governances (organizations that are not part of governments and operate outside of government or political structures, yet focus on development in social/societal, community, and environmental areas) may provide these. FIG. 246 and E: Said self-service management, whether by individuals, vendors, governances, etc., may provide continuous visibility of success/failure from said user management choices, so that corrective actions and modifications may be made at any time as needed, whether by individuals, vendors of single devices or multiple goals-based "bundles" of products and services, third-parties, governances, etc.

FIGS. 248, 249, 250, and FIGS. 264, 265, 266: To provide collective means to specify goals and achieve them collectively, Governances are described and illustrated including some examples (for Individuals, Corporations and larger trans-border Governances); including some examples such as their selling a lifetime plan for "Upward Mobility to Lifetime Luxury" and offering membership in a Governance where the customers exercise more direct control "Customer Control, Inc."

FIGS. 255, 256, 257, 258, 259, 260, 261, 262, and 263: It is an object of these systems, methods and processes to utilize the Digital Camera/Photography Industry as an illustration of the AKM including both its operation and utility for evolving a device (such as the "mature" digital camera) into a higher performing device with a built-in marketing channel based on what may be learned by interacting with customers.

FIG. 267 exemplifies the ramifications of an AKM and Active Knowledge by means of accelerating transformations, along with the emergence of "AnthroTectonics": Devices and governances become dynamic, self-aligning instantiations of humanity's current goals, new knowledge, emerging know-how, and new group and organizational processes that rapidly (even immediately) put those into use worldwide to achieve current and new goals both individually and/or collectively.

In brief, with an AKM "each user is the filter" for knowledge—that is, the Active Knowledge Machine (AKM) accesses and delivers the appropriate AK (both AK Instructions, related knowledge, etc.) that fits a user(s), device(s), system(s), task(s) and/or step(s). Simultaneously, appropriate sponsor messages and/or marketing are included. Results are optionally obtained and when AKI or AK are used successfully this can dynamically increase or decrease the selection of AK for a trigger which identifies the appropriate subset(s) of stored knowledge, instructions, links to additional AK, marketing messages, etc.; which may be for anonymous or identified users.

Active Knowledge is also a dynamically improving resource because the AK Machine (AKM) contains means for self-improvement. In some examples there are a range of means for users to add, edit and/or validate the stored AK Instructions, AK, links, etc. delivered in response to each trigger event, including dynamic interactive edits at the point of use. In some examples there are automated systems for raising the accuracy of the AK delivered based on the results from AK deliveries. In some examples there are reporting systems for informing individuals of various results produced, along with means for self-selecting goals to be achieved and then seeing current progress toward reaching said goals. Overall, these and other means for continuous improvement assist in replacing one or a plurality of current problems with delivered solutions.

As one or more AKMs are built and assist more people, this may replace the current cumbersome processes of relatively inaccessible static knowledge with more responsive active knowledge processes. A growing range of obstacles might be replaced by progress, difficulties by efficiencies, and today's rate of growth in productivity by a new level of performance even when technologies are new or new tasks are challenging—perhaps making more of the world's crises and barriers into successful achievements.

In addition, in some examples users who are using a device and making some types of improvements (such as in some examples AKM improvements and in some examples other types of improvements such as from an online forum or social media) may be able to associate with other users who are making similar improvements, in some examples in an SPLS, in some examples in a constructed digital reality, in some examples in a vendor-provided digital reality, in some examples in a focused connection, and in some examples in another type of shared digital reality.

Detailed description—an AKM serves both anonymous users and identified users: FIG. 193 shows in some examples a a great deal that is not called out. In FIG. 193 Active Knowledge for anonymous users 7102 and/or basic Active Knowledge services 7102 may be provided by means that include requests for AKI (herein Active Knowledge Instructions) and AK (herein Active Knowledge) may be sent by devices 7103 and/or by users' AIDs (herein Alternative Input Devices) 7103. As used herein, "devices" include products, equipment, services, applications, entertainment, etc. Said requests 7103 are transmitted to and received by an AKM (herein Active Knowledge Machine) 7100 which accesses Active Knowledge Resources (herein AKR) 7114 to obtain said AKI and AK by means of Active Knowledge Databases 7115 7116. The AKM 7100 delivers said AKI and AK to said anonymous users' device(s) 7103 and/or users' AODs (herein Alternative Output Devices) 7103. Also in FIG. 193, Active Knowledge for identified users 7104 and/or paid AK services 7104 may be provided by means that include requests for AKI and AK 7105 that are sent by devices 7105 and/or by users' AIDs 7105. Said requests 7105 are transmitted to and received by an AKM 7100 which accesses AKR 7114 to obtain the appropriate AKI and AK by means of AK DB's 7116. The AKM 7100 determines said identified users preferred, available devices 7106 to receive said AKI and AK by means that may include authentication and authorization 7107, and presence services 7109 that determined which of said identified user's Devices In Use 7110, either of which utilizes said identified users' profile(s) 7108 to confirm said identity and currently available devices. The AKM 7100 delivers said AKI and AK 7111 to the determined appropriate device(s) 7106 7111 which may include a range of Devices In Use 7112. Said AKR 7114, Which is accessed by said AKM 7100, may be stored in AK DB's 7115 7116 that are native to the AKM or may exist outside of it, and be accessed from a wide range of sources 7117.

Summary of the AKM process: FIG. 194 shows the AK process in a somewhat greater detail, though a great deal is not called out. In FIG. 194 devices 7121 and/or users 7122 make an AK request 7120 from the AKM 7124 by means of trigger events in the use of devices 7120, or by a user making a request 7120. The AKM receives the AK request 7124, parses it 7125 to determine the device, step, AKI and AK needed 7126, and retrieves those from the AKR 7127 7129, including any sponsor message(s), marketing, advertising or other commercial information 7140 7144 that is connected to said trigger or request 7120 by AKM sponsors or advertisers 7140. If needed to parse and determine said trigger 7125 7126, the AKM may optionally query said device or user 7128. The AKM delivers said AKI, AK and sponsor message(s) 7130 by in determining the receiving device 7131, formatting said AK and messages for said device 7132, transmitting said formatted message to said device 7133, and logging said event 7136. Said AKI, AKI and sponsor messaging may include a variety of content such as AKI (Active Knowledge instructions for that step), a link to the next task step, links to additional AK such as the "best choice" for that type of device based on actual usage, links to reports or dashboards on an individual user's or group's performance, advertisements from competing vendors, etc. Said device or user may optionally reply with the result from said message delivery 7134, in which case if unsuccessful 7135 said result may be treated as a new trigger and AK request 7124 so that the process may be adapted and repeated; or if successful additional AK, links, marketing, etc. maybe added and sent 7139; in either case, whether unsuccessful or successful, said device or user may optionally reply with the result 7134 from said additional message delivery; with each event being logged 7136. Said logged events are stored in AK results 7137 with optimization and improvement services 7138 performed to include improvements such as the accuracy of said AK determination 7126, quality of said AK content 7127 7129, the format of said AK messages 7132, etc. The AKM may have various means for generating revenues, one of which may include AK sponsor services 7140 such as sponsor selection 7141 such as by sale, auction, etc. in each area such as by category of product or service, by (optionally named) competing products, etc.; the entry of deliverable messages by the sponsors selected 7142, storage of said sponsors' messages and links to additional sponsor information 7143; provision of said stored messages and links for delivery with AKI and AK 7144, obtaining results from said AKI and AK deliveries to said devices 7136 7137 7148 7150 7149; and obtaining payment from sponsors 7145 by fixed or variable payment schedules such as CPM (cost per thousand) deliveries to devices and or users 7133, or click through use of sponsors messages 7134 7136 7137 7150 7149. AK reporting is by means of standard or custom dashboards, standard or custom reports, etc. 7146, which utilizes said logged events 7136 and stored AK results 7137 to run standard reports and analyses 7147 that in turn produces ranked stored data 7148 from which both standard and custom dashboards and reports 7149 may be displayed. In addition, Web and other requests 7150 may provide custom dashboards and reports to individual users, sponsors (such as advertisers), device vendors, AKM business systems that employ AK results data, other external applications that employ AK results data, etc.

Summary of the AKM interaction engine: FIG. 195 shows some examples of the AK interaction engine in somewhat greater detail, though a great deal is not called out. In FIG. 195 anonymous users and devices 7152 illustrates the anonymous flow from a device 7154 wherein a trigger is received 7155; AKR 7157 is accessed 7156; and AK is delivered 7158 (including AKI 7158, next steps 7159, links to AK and higher performance options 7160, offers such as subscriptions or services 7161, ads and marketing 7162; etc.); and means for editing or creating AKI and/or AK 7175; along with logging of said anonymous event and results 7176. In FIG. 195 identified users and devices 7164 illustrates the identified flow from a device 7165 and/or a user's AIDs/AODs 7166 wherein a trigger or a request is received 7167. Because of identification 7164 access to AKR 7157 maybe more personalized or customized 7168 such as by utilizing individual user AKM record(s) 7171 for performance analysis and escalation 7170, in some examples of which might include links to short "show me how" movies where prior rates of failure and success indicate that a demonstration may raise said user's rate of success 7169. Said AKI and AK are delivered to said identified user's appropriate receiving device 7172, whether the original requesting device 7165 or the user's AID/AOD 7166, and may consist of AKI 7172, next steps 7173, links to AK and higher performance options 7174, offers such as subscriptions or services 7161, ads and marketing 7162, etc.; and means for editing or creating AKI and/or AK 7175; along with logging of said identified event and results 7176.

Summary of identified users' Active Knowledge process: FIG. 196 shows a summary of the Active Knowledge process of identified users, though a great deal is not called out. To start, the AKM receives a device's trigger or a user's request 7177. That device or user is identified and authenticated 7178, that user's AKM record(s) is accessed, and appropriately related and previously stored performance metrics are retrieved 7178. The current performance, as contained in the device's trigger or user's request 7177 is compared to said user's previous metrics 7179, and/or collective AK performance metrics 7179, to determine appropriate AKI and AK to retrieve and deliver 7179. Said identified user's preferred device/media is determined from said user's profile 7180, said AKI and AK message is constructed and formatted for that device 7180 and delivered with both appropriate content and links to additional relevant AK 7180. After said delivery results are received 7180 and if negative either additional AKI and AK are sent 7181, or said AKM process is ended if the user does not want more 7182. If after said delivery results are received 7180 and said results are positive, user may imply links for more content for options 7183. If said user does not want more 7183, then said AKM process is ended 7185. However, if user does want more 7183 then multiple options are available 7184 such as selecting or editing one or more goals, determining said user's preferred device(s) to receive goal supporting AK, using links or accessing AK to help achieve said goal(s), etc. In the aforementioned process for identified users events are logged and said user's derived metrics are stored for access along with said user's AKM record(s) 7181.

AKM storage—AKM parallel structures for doing, storing and accessing: A variety of data are included in AKR (AK Resources) but in general these are mapped to actual real-world uses so that said AKR storage may be accessed by means of known and frequently utilized techniques. In some examples a barcode identifier is employed; in some examples are the product UPC or SKU, and in some examples is the usage lifecycle depicted in FIG. 197. In the examples the components may consist of any combination of devices, components, modules, systems, processes, methods, services, etc. at a single location or at multiple locations, wherein any location or communication network(s) includes any of various hardware, software, communication, security or other components. To illustrate this in some examples the means depicted in FIG. 197 employs the usage lifecycle.

FIG. 197 illustrates a parallel relational structure between AKR (Active Knowledge Resources) 7202 7203 and the life cycle of use in the real world 7207. In FIG. 197 AKR 7202 is accessed for both anonymous users and basic services 7200, and for identified users and paid or premium services 7201. Said AKR 7202 7203 is comprised of parallel knowledge structures in which Active Knowledge Databases (herein AK DB) 7204 are mapped to the life cycle task structure wherein devices are used 7204, comprising parallel knowledge structures that consist of AK DB indexes 7205 that are used to access and retrieve AKR from said AK DB's 7206 which may be from the AKM, multiple vendors of devices, third-party services, users' sources, and other sources 7206. As used herein, "devices" include products, equipment, services, applications, entertainment, etc. Said lifecycle of use 7207 is in general comprised of successive stages and tasks which may include: Pre-purchase 7208: Find choices 7209; Obtain information, reviews, comments, etc. 7210; Or other pre-purchase tasks and steps 7228. Purchase 7211: Select and specifying 7212; Obtain approval for purchase 7213; Buy (consumers or public), or purchase (business or corporate) 7214; Or other purchased tasks and steps 7228. Install, set up, configure, verify 7215: Or other insulation and/or configuration tasks and steps 7228. Use 7215: Basic uses 7217; Advanced or expanded uses 7218; Applications and tasks 7219; Or other usage tasks and steps 7228 such as: First or initial uses of a device; Discovering and learning new features; Learning new combinations of features; Re-discovering and re-learning infrequently used features; Learning about a new area or activity by using a device in greater depth; Devices intended to be used without training or advance learning (such as an ATM); Difficulty/question/additional information: If a user is engaged in or doing a task, and encounters a difficulty or has a question, and wants instructions or additional information, or feels some type of additional communication or information might produce a more successful or satisfying result. Purchase parts, consumables, accessories, etc. 7220: Replacement 7221; Modules or parts for additional uses 7222; Or other tasks and steps involved in purchasing parts, consumables, accessories, etc. 7228. Troubleshoot, repair, solve problems 7223: Self-service 7224; Customer support 7225; Buy technical support or repair services 7226; Or other tasks and steps for troubleshooting, repair and/or solving problems 7228. Upgrade, replace 7227: Either remain with the same vendor or return to the pre-purchase stage 7208; Or other tasks and steps for upgrading and replacing 7227.

AKM processes for performance analysis, comparisons and escalation: The method of providing AKI and AK may further include performance analysis and escalation as illustrated in FIG. 198, and said performance analysis may also include setting a performance status indicator as illustrated in FIG. 199. FIG. 198 illustrates the AKM performance analysis and escalation service for identified users. In FIG. 198 the AKM receives triggers or user requests 7230 from an identifiable user 7231 and retrieves that user's metrics for that trigger's or user's request device, task, the goal, etc. 7231 7232. And analysis is performed 7233 (which is further explained in FIG. 199) to set a performance status indicator 7233 by means of a comparison 7234 against both that user's goals 7232 and AK results 7235. Based on said performance status indicator 7233, variable AKI and AK guidance 7238 are accessed and retrieved from AKR 7248 such as: Use-based guidance 7240 may include AKR such as: AKI for that step 7241; A link to AKI for the next step 7242; Links to AKI for related steps 7243; And other AK, marketing, offers, etc. Goal-based guidance 7244 that may provide one or more path(s) to said user's goal such as: High-performance options 7245; Other AK, guides, resources, etc. 7246; Advertisement (s) for relevant alternatives 7247; And other AKI, AK, marketing, offers, etc.

Said variable guidance 7238 uses said storage process 7203 to retrieve AKR 7248 which is delivered to said identified user 7250 by means of user's appropriate device(s) in user's appropriate format and/or preferred media 7251. Based on results received 7253 derived metrics are produced 7252 7253 7254, logged and the appropriate results data are stored in said identified user's AKM record(s) 7256 7257. In addition, a record of said AKR delivered 7250 7251 to said identified user 7231 is stored 7258. Said user may optionally utilize delivered links to request more AKI, AK, marketing, offers, etc. 7259 and if so, said user actions are treated as triggers or user requests 7230, but if user does not want more then said process ends 7236. Optionally, if positive results are not produced 7253 then that may be treated as a trigger 7230 to assist said identified user in achieving task success 7240 or a specified goal 7244.

FIG. 199 illustrates the AKM analysis and comparison process which may be either trigger-based or user request-based. In FIG. 199 the AKM waits for a trigger or a user request 7261, and when it is received 7260 it creates a new AK event with a session ID 7262. If said trigger or user request is anonymous 7263 7264 said session is indicated as such and handled appropriately 7280 and FIG. 200. if said trigger or user request is from an identified user 7263 then appropriate data is retrieved to set a Performance Status Indicator 7266 (herein "PSI"). If said trigger is in a normal performance range 7267 7268, then no performance status indicator is set 7270, but if the trigger is outside a normal performance range then the gap from that range may be calculated and stored 7269. Optionally for anonymous users, said gap from the normal range may be used to set a PSI for said anonymous users 7270 such as a more severe PSI for a larger gap and a less severe PSI for a smaller gap. If said user is identifiable then access said user's performance record 7271 7275, but if said message is a user's request then assume a higher priority and set an appropriate PSI 7272. If a trigger from an identified user, utilize said user's AKM record(s) 7275 to determine if said trigger is in user's acceptable range 7273. If said trigger is in user's acceptable range 7273 7275, then no performance status indicator is set to 7274, but if the trigger is outside said user's acceptable range then the gap from that range is calculated and stored 7276 and an appropriate PSI is set 7278 such as a more severe PSI for a larger gap and a less severe PSI for a smaller gap. Optionally, PSI's based on user goals may be different from PSI's based on normal performance, so that a user may specify a performance goal that is substantially higher than the normal range (that is, said user may reject "normal performance" as acceptable and target a higher rate of personal success). For an identified user 7263 7266, if both said trigger and said user request are within acceptable ranges 7270 7274, then optionally notify said user 7265, or proceed without said notification if escalation is not expected for normal performance. If either said trigger or said user request are outside said normal ranges, an appropriate PSI is set 7279 and utilized for accessing AKR (see FIG. 200).

AKM process for PSI retrieval of AK and logging users' actions: A further object is access and retrieve ARK based on the presence or absence of a PSI (Performance Status Indicator), and then to log the AK provided and/or (optionally returned) results and user actions from the AKI and AK delivered. Said logging occurs for both anonymous users and identified users, but if anonymous only the AK results and subsequent AK-related actions are recorded. If a user is identified, then those results may be stored within or retrievable by the user's AKM record(s) to enable additional services such as individual performance analysis and customizable AK assistance. FIG. 200 continues FIG. 199 10200 by adding AKR retrieval based on said PSI and the logging of resulting user activity(ies). FIG. 200 continues with said AK event with a PSI (if set) 10201. If an anonymous user 10202 then appropriate AKR are retrieved 10203 10206 based on whether a PSI was set, and if sat the level of severity and escalation. Said appropriate AKR is delivered to said anonymous user's device 10204. If an identified user 10202 and user's delivery profile is enabled 10205, then user's appropriate Device In Use for delivery is determined 10207, appropriate AKR are retrieved 10208 10206 based on whether a PSI was set, and if sat the level of severity and escalation. Said appropriate AKR is delivered to said identified user's appropriate device or AOD 10209. Based on said AK delivery 10204 10209 said user's subsequent activity(ies) is optionally logged in complete or burying levels of detail 10210 beginning with the result of the current step 10211. If a negative result 10211 10212 said PSI should be escalated to a higher level of severity and user may optionally want a delivery of modified AK such as additional performance resources 10214 or other AK resources 10203 10208 10206. If a positive result 10211 user has also received other AK and links as part of said delivery 10204 10209 such as links to next steps 10213, links to other AK 10214, advertisement(s) 10215 10217, offer(s) 10215 10217, etc. If those are not used then said AK process is ended 10216. Whether ended 10216 or utilized 10211 10212 10213 10214 10215 10217 said user actions are logged 10220 and stored appropriately in user's AKM record(s) 10221 10222 if an identified user.

AKM user performance record(s): FIG. 201 illustrates data that may be stored and accessed in a user's AKM record(s) by means of data records. Since each user may have one or more AKM record(s) that could each be associated with different AKM processing and/or service(s), then each service may have its own standardized AKM record(s) for each of its customers, or they may be combined in one central user AKM record(s) (with optional groupings such as one combined AKM record for all public identities, with a separate AKM record(s) for each private identity and secret identity), or they may be separate but associated with each other so that they can be retrieved as if they were combined in one AKM record. In some examples in FIG. 201 when a user's AKM record(s) is accessed 7281 7282 the performance elements in said user's record 7283 may include:

User's AKM delivery profile (including devices, AIDs/AODs, etc) 7284 for sending AK requests and/or receiving AK deliveries. For each device, one or a plurality of parameters 7284 such as language (in some examples English), AK format capabilities (in some examples text, video, audio, images, etc.), latency (in some examples real-time use only or AK message storage for later use), Web links capability (in some examples ability to link to related AK, best products, ads, etc.), display capability (in some examples if a small screen it may may be set to receive AKI [instructions] only with very small ads, and in some examples if a medium or larger screen it may be set to receive both AKI and AK content and larger ads with user control by means of links or other navigation), etc. User's preferred device order for receiving AK via said AID/AOD devices 7284.

User's subscription or other plan(s) 7285, which may be paid and/or free. For each plan, one or a plurality of parameters 7285 such as named (and personalized) or treated as anonymous, reporting/dashboard settings, current performance alerts, performance escalation options, etc. If a paid plan, a renewal and/or expiration date for each subscription or plan 7285.

User's devices in use 7286 (as used herein, "devices" include products, equipment, services, applications, information, entertainment, etc.). User's satisfaction with each or some of said devices in use 7286.

User's performance data with said devices in use 7287 which may include merely AK events where said user has received AK, and not every use of said DIU's; with said stored data including stored data items such as: The device in use 7287; If there is an (optional) goal associated with said device, in some examples QOL (Quality of Life) goal being the user's rate of success with said device 7287; A task identifier 7287; A step identifier 7287; The user's current performance at said task and step 7287 such as indicators or flags for the latest result received or each result received such as one failure, a string of repeated failures (with one flag or separate flags for different numbers of task or step failures), success after receiving AK once, etc.; An optional status indicator 7287 such as a PSI set by means of a process such as in FIG. 199.

User's AK resources delivered, received and/or used 7288 including optionally the date and one or more of a plurality of parameters such as language (in some examples English), media (in some examples text, video, audio, images, etc.), latency (in some examples used in real-time or stored and used in at a later time), links usage (in some examples a next step, best product(s), related AK, goals, advertisement(s), etc.), etc. For each AK delivery, the optional recording of the date it was delivered 7288.

AKM component services—accessing AKR (AK Resources): FIG. 202 illustrates the AKM process for accessing knowledge resources for various types of AK events during the use of devices. After an AK event has been initiated (as illustrated elsewhere) an AK event with an optional psi (severity indicator) 7300 exists. The next step is to determine the AK event type 7301, however if this is unclear then it may be passed to error handling services 7302 which are illustrated and described elsewhere 7320. If said event type is known 7301, then depending upon which event type it may be 7303 7304 7305 the appropriate AKI and AK AKI and AK are retrieved 7306. Said AK events during the use of devices may be by means of a trigger such as a task failure, task retries, cast exit, etc.; or by means of a user request utilizing an AIDs/AOD such as at a task failure, to obtain an alternate task path, to learn about alternate devices such as the best available product or service for that goal, task were use; or by a user's need to repeat and AK delivery such as if the delivered AKI failed, the delivered AKI worked but poorly, the user replies that the AKI is wrong, the user wants an alternate task path to the AKI received, etc. Retrieval of the appropriate AKI and AK 7306 are illustrated in this figure based upon the AKR storage structure and schema illustrated in FIG. 197, but this is not a limitation since alternate storage structures means may be utilized (such as barcode identifiers, product UPCs, etc.). As illustrated herein, said retrieval of AKI and AK 7306 are performed by automated and/or manual selection of device 7307 (such as a product, equipment, service, application, etc.), lifecycle stage 7308, task 7309, step 7310, identified user 7311 and that user's needs as determined from said user's AKM record(s) 7316, then retrieve the appropriate to AKI and AK for that identified device, context, user and severity level 7314 7315 (as further illustrated in FIG. 203, FIG. 204 and elsewhere). If said access process 7306 is insufficient to obtain the appropriate AKR, then a search may optionally be conducted in force said AKI and/or AK 7317 7318 by utilizing criteria available from said AK event, device trigger, user's AKM record(s), user's request, etc. If not found, then said AK event and appropriate to related parameters and criteria may be passed to error handling services 7302 which are illustrated and described elsewhere 7320. If found, whether by retrieval 7306 or by search 7317, said AKI and AK are delivered to said device and/or user 7321 by determining user's preferred device/media to receive AKI and AK 7321, and formatting said AK are for that device/media 7321. Said AK message is stored temporarily for delivery 7322.

Near real-time AK baseline(s) and gap analysis: FIG. 203 illustrates the AKM process for calculating an AK performance baseline(s) (which may optionally be calculated in real-time) and gap analysis based on said performance baseline. What we the may be used in gap analyses for individual interactions, for groups/classes of interactions, for AK reporting or AK dashboards, etc. In FIG. 203 one or a plurality of users 7324 utilize one or a plurality of devices 7325 that are defined but may include devices 7326, LTP's 7327/MTP's 7327, RTP's 7328, and/or AID/AODs 7329. Said triggers or user requests from said devices 7325 are aggregated and processed 7330 by means that may include network servers, application(s) and/or applications servers, AK and AKR database(s) and/or database servers, and/or users' AKM record (s). The calculation of said AK performance baseline(s) and/or gap(s) 7332 determines whether each AK of then to is above or below the current average baseline 7333 and how large a gap 7333, this is more than binary success or failure metric because it may include, in some examples the number of trials they user performed before a task failed or succeeded, or whether the AKR delivered produced task success, eventual task success after several attempts, or did not succeed. Said analysis and calculation 7332 7333 is performed by accessing prior AK results 7335 that have been prepared as ranked information for purposes of comparisons, and if said users are identifiable 7334, accessing said users' AKM record (s) and stored performance data 7334. Baselines are either read from prepared and ranked AK results 7335 or calculated from an appropriate subset of said AK results 7336, and compared with the current interaction 7337; or if with an identified user 7324 then said user's prior performance 7334 is included in said baseline calculation 7336 for comparison with the current interaction 7337. By comparing said baseline 7336 with said current interaction 7337, a gap size 7338 may be calculated and utilized in as part of determining a PSI 7338. If said gap is large and/or PSI is severe 7340, then appropriate AKR may be retrieved and delivered to improve said performance 7340. If, however, said gap is small and/or PSI is small or there is no gap 7339, then either no AKR needs to be retrieved or else only minor AKR may be retrieved and delivered to improve said performance 7339. One interesting and notable case is where said identified user 7324 may have set a substantially higher goal then the current baseline 7333 7336, wherein said user's performance exceeds the performance baseline yet falls short of his or her personal goal(s)—in which case said personal gap size and PSI may be large and severe 7340 while at the same time said user's AK gap size and AK PSI are small or there is no gap 7339. In such a case, said user is identified by means such as a subscription, service, etc. that could prioritize and deliver AK that assists in improving said user's performance if needed. After said AKR is delivered 7339 7340, results and user actions are (optionally) received and stored in AK results 7341 and/or identified users' AKM record(s) 7342.

Optimization(s) to deliver best AKI and AKR: FIG. 204 is a high-level summary of AKM optimization(s) to select and deliver the best AKR to drive continuous improvements in the measurable rates of AK success and satisfaction; in this figure, a great deal is not called out. A point of this introductory illustration is that AK is a dynamic, continuously improving resource (that is, AK is not merely static stored knowledge such as on a web page, in an encyclopedia or book, or in another type of stored static information). These AK optimization processes may be employed for varied goals such as: (1) raising the rate of success of those below the current baseline up to the current standard, (2) attempting to raise the average current baseline performance up to the level(s) of the best performers, (3) raising an identified user's individual rate of performance in an area up to the level(s) of the best performers, (4) raising the performance of the best performers to new and higher levels so that others may also achieve that in the future, (5), etc. A succession of stored baselines may be compared, calculated and graphed to show improvement or declines over time, which may indicate the cumulative impact of the AKM, and/or AKM optimization processes. In FIG. 204 either an initial or current baseline(s) 7345 is the starting point for optimization(s) for incremental, continuous or absolute improvement(s). Said AK optimization process(es) 7347 access AK data and AK DB's such as user AKM record(s) with available stored user performance records 7348, AK results (raw data) 7349, and/or AK results (prepared, ranked information) 7350 to determine and/or calculate current performance levels 7352, current baselines 7352, current reference sets of reportable data 7352, current user goals 7353, identified users' target levels of success, satisfaction, etc. 7353, and/or available and retrievable current PSI (Performance Status Indicator) sets 7354. Said accessed AK data 7347 7348 7349 7350 7352 7353 7354 may be accessed systematically and periodically 7355 based upon rules such as prior rates of success and/or failure, recency, or other types of prioritization's so that a plurality of types of issues or items may be tracked and optimized over time 7355. Said issues or items 7355 may be periodically or continuously reported by means such as reports and/or dashboards, as described elsewhere. At a high level, said AK optimization process affects the accuracy of AKR selected along with the quality of AKR content based upon updated selection algorithms for anonymous users 7356, and the utilization of identified users' preferences in their AKM record(s) 7356, along with service level differences based on whether users are identified, paid, subscribers, anonymous, etc. 7356. Optimizations are based on results from real AK uses 7357 whether in optimization "sandbox" testing and/or actual AK results 7357, and whether these produce gap closures, reductions, or gap expansions 7357. Said AK optimization process may be characterize as having the goal of maximizing the rate of human success 7360 by means of "sandbox" tests 7361 7362 and/or actual AK results data 7361 7362 to continuously improve the accuracy of AKR access 7361, the impact of AK deliveries 7362, as well as the quality of AK content (as described elsewhere). Said optimization processes are cyclical and repetitive 7358 7356 and may be thought of as continuous since new devices, AKI, other AK resources, more advanced communications, new technology capabilities, and other improvements are added continuously 7358. As optimizations improve AKM performance 7346 7364 the latest AK results are utilized to calculate successive and subsequent optimized AKM baselines 7364.

Said successive AKM baselines from optimized results 7364 are stored in appropriate AK DB's that may include AK results (prepared, ranked information) 7350, AK results (raw data) 7349, and/or user AKM record(s) 7348. Said successive AKM baselines and associated stored data may also be utilized to report and/or display the "visible value" of the AKM and/or an AK service 7365. Said "visible value" may be calculated and reported by various means, one of which is illustrated herein 7366 7367 7368 7369. Since the AKM receives triggers from a range of devices, and thereafter attempts to deliver AKR and receives results from said deliveries, the AKM is able to identify and log AK events wherein AK deliveries were not used to as well as those where said delivered an AK was used 7366. Data from those who do not use AK may be compiled into one or more types of baselines 7366, whether from a sample of said nonusers or other types of datasets. By utilizing known comparison means, current AKM baseline(s) may be compared to known results from nonusers of AK to calculate the gap(s) between them. As another part of this "visible value calculation, the cost(s) of AK resources and/or AK systems may be determined 7367. By utilizing these and similar data, AK value added and AK ROI may be estimated or calculated 7368, whether for parts of the AK system, for the whole of AK, or for AK services and features. The results of said calculations may be reported publicly 7369 by means of various types of reports and/or dashboards (which are described elsewhere).

AKM subscriber QOL (Quality of Life) improvement process: FIG. 205 and FIG. 206 illustrate an AKM process for identified users to set Quality of Life (herein QOL) goals, receive results based upon each goal(s), and edit or change those goal(s) either based on progress toward said goal(s) or to change goal(s) in order to achieve new and subsequent goals. In FIG. 205 a new or an identified user/subscriber 7370 (e.g., with an ID and a user AKM record(s)) begins this self-service QOL process 7386 with a startup goals review and goal(s) selection 7387. Said startup review and selection may include initial recommended goals provided by said identified user's service to which said user is subscribed or a member 7387. Either alternatively or additionally, said identified user may be presented with QOL goals that have been set by others, including frequency and results data 7387 such as (1) how often each QOL goal was chosen, (2) the most popular QOL goals chosen either recently or over a long period of time, (3) average results achieved from each QOL goal such as percentage who achieved in each goal, with rankings such as the most successful QOL goal(s) first, (4) dashboards or other reporting to show the overall current goals status, such as for your country which QOL goals are currently being pursued (in frequency order) and how successfully or unsuccessfully are they being achieved (with sorting options such as re-listing in percentage of success order). After said identified user 7370 selects an initial QOL goal(s) 7387, a QOL measurement and reporting process 7372 may be optionally provided for said user (which may be an automatic process or an extra cost component of said user's subscription or membership, such as a feature provided to a service's paid versus free members, or to its premium versus basic members). Said QOL measurement and reporting process 7372 includes identifying and logging a plurality of said user's devices 7373 for AK events and AK communications; organizing user's AK events, devices and stored performance results in an AKM record(s) 7374; monitoring said identified user's AK events during an initial time period 7375; receiving collected AK data, results and measures 7376 from user's devices and AK communications; storing said initially collected AK data in said user's AKM record(s) or accessible in an accessible database(s) related to said user's AKM record (s) 7377; and process said initially collected AK data into a user's initial QOL goal baseline(s) 7378. Once an initial baseline(s) has been produced, AK QOL results may be reported to said user 7379 7384 such as in periodic notices, e-mails, text messages or other messaging, links in AK delivered, or by various self-service means by said user. Said user may then conduct subsequent QOL goals reviews 7388 in which user may evaluate (1) current progress toward QOL goal(s) 7388, (2) current baseline(s) and achievement(s) compared to an initial baseline(s) 7388, (3) comparisons with QOL goals set by others, including comparisons with results achieved by others 7388, (4) "best results" received by others, and comparisons of said user's performance versus others "best results" 7388. Those comparisons allow said identified user to see gaps 7389 which indicate whether each targeted QOL goal(s) is being substantially achieved or not achieved. At any time said user may edit or change one or more QOL goals 7390, such as to improve performance toward any goal by editing any of its parameters, or to remove a goal because it has been achieved or said user wants to remove it, or to add a new goal. (See FIG. 206 for the process to edit AKM QOL options and/or goals.) If said edits are unnecessary and said user accepts the current QOL process, then said QOL goals self-service management is done 7391. If edits are to be made, then these may include QOL goals, priorities, metrics, targeted results desired, AKI and AK delivery devices, etc. 7392. After edits are made, said user's updated QOL goals criteria are stored in user's organized AKM record(s) 7393. After said edits, said QOL measurement and reporting process 7372 receives subsequently collected AK data, AK events, results and other measures from devices 7380 by utilizing user's edited and updated QOL goals and criteria 7393. Said subsequently received data 7380 are stored in user's organized AKM record(s) 7381 and used to process and calculate current, updated baseline(s) 7382, and to generate and deliver updated AK QOL goals reports based on that user's updated QOL goals and criteria 7379.

FIG. 206 illustrates the process when said identified user selects editing of QOL goals and/or options 7390 7392 7394. QOL goals and options editing 7395 includes means for choosing QOL goals and preferences 7396 7398. If a new QOL goal is to be added 7398, this includes ambiguous goal matching 7194 7195 in case there is more than one meaning or QOL goal in an area 7196. If that is not the case, then said ambiguous matching is not needed and terminated if in vote 7197, but if that is the case then information on goals apparently selected is displayed 7198 such as the meaning of each QOL goal, results, values such as the average current rate of success, etc. If, based on that information, the desired goal is not missing and is in fact present 7199, then said user is asked to select the correct desired goal 7290. If, even though goals explanation in information is provided the user's desired QOL goal is missing 7199, then said user is asked to add the correct goal by browsing available and accessible lists of QOL goals 7291, or by searching said available QOL goals 7291. If either browsing 7291 or searching 7291 produces the desired QOL goal 7292, then said user is asked to select the correct desired goal 7290. If said user's QOL goal is not found 7292, then the user is asked to add, describe, and confirm the new QOL goal 7293, along with adding any parameters or metrics required to measure and report said new goal. If a QOL goal is to be edited 7396 7398, then that may be done by editing or entering the targeted rate of success desired while using devices (as defined by the AKM) 7399, the targeted satisfaction or other metric(s) while using devices 7186, if a link is wanted after AKI to the next step to take 7187, if a link is wanted after AKI and AK to the most successful device in that category 7188 (which generally includes means to research and purchase said "best" device), if AK and links are wanted after AK to AK and guidance in each goal 7189 (when tasks are done and the success of QOL goals is affected 7189, if a link is wanted to after AKI and AK to QOL goals selection and editing 7189, if a link is wanted to means to provide feedback or comments to others on said device 7191, if links are wanted to related devices, QOL goals, AK, other types of guidance, etc. 7192, along with access to other types of QOL goals editing and AK services or content related to achieving said QOL goals 7193.

AK sources and construction: FIG. 207 illustrates a high-level AK database architecture for AKR 7051 along with some sources of AK content 7052. Said AKR database architecture includes one or more metadata repositories or applications, and/or indexes 7053 which may be stored in one or more locations, whether as a single distributed index(es), as multiple copies of the same index(es), or day of these where some are provided by independent third parties. Said metadata and/or indexes 7053 may point to multiple AK databases 7054 such as AKI databases 7055; AK databases, links to appropriate AK content, or stored links to AK sources 7055; advertisement databases 7056 from AKM sponsors or advertisers; AKM metrics and/or measurements databases 7057 that may be accessed in as part of selecting AKI and AK such as for PSI's (Performance Status Indicators that may be employed in escalated AK events); external sources 7058 that may be accessed by means of AK API's to provide AKI, AK, links to AK, etc. (use of said AK APIs is described elsewhere). Said metadata and indexes 7053 may point to and access multiple AKR databases from AK systems, vendors, third parties, competitors, customers, Websites, corporate or public resources, customers, users, etc. While the sources of these AKR 7051 7053 7054 may appear to be entered separately as metadata 7060 and as content 7068 these may actually be entered by means of a single interface or application in which all these data appear to be provided together but are in reality stored separately and appropriately in one or more respective metadata repository(ies) 7053, indexes 7053 and/or AK DB's 7054 7055 7056 7057 7058.

The metadata/index schema depicted herein 7060 refers to the lifecycle model illustrated in FIG. 197, but does not preclude different metadata/indexing and retrieval that would be employed if AK access were based on UPC's, barcode identifiers, or any other classifications or categories (such as depicted in FIG. 215). Said metadata 7060 and content 7068 are editable and/or creatable by vendors, users and/or others 7074 7075. Said metadata and/or indexes 7060 are editable but relatively stable because they point to content categories 7068 such as devices 7061; lifecycle stages (optional) 7062; tasks 7063; steps 7064; metrics 7065 such as success, satisfaction, etc.; advertisers and advertisements metadata or indexes 7066; and/or other metadata 7067. Said content 7068 are creatable and editable by broad groups 7075 at a more dynamic rate to fit a plurality of changing devices and may include metrics or scorers that represent their quality to assist in more accurate selection of appropriate content. Said content 7068 may include AKI instructions 7069 such as text; AKI and AK media 7071 such as video, audio, etc.; AKI and AK advertisements in multiple formats 7070; metrics or scores 7072 for each content and metric tracked; and/or other content 7073.

AKI and AK message construction and display: FIG. 208 illustrates AKI message construction and display in which AKI and AK content is retrieved for constructing AKI and AK messages 7076, from AKR 7077 7078. Said AKI and AK elements retrieved 7079 (some of which may be optional) may include items such as: Header data: Sender data (e.g., address, etc.), Receiver data (e.g., address, etc.), Title data, Date/time data, Severity data (e.g., PSI, etc.). Body content data: AKI (Active Knowledge Instructions), Link(s) or other access means: Next step(s), Link(s) or other access means: Highest performance devices, Link(s) or other access means: Advertisements/marketing, Link(s) or other access means: Subscription offers or service(s), Link(s) or other access means: Other resources/services, Link(s) or other access means: Edit/create AKI or AK.

As described elsewhere numerous variations may be tested and optimized over time with those variations received from users, vendors, experts, and a plurality of other sources. In some examples an AKI/AK hierarchy may be proposed for testing and optimization with one of those including parts such as this hierarchy: AKI for this step, Next step(s) [in order], Finish line (how to get to it quickly), Related goals to choose from, AK for this task or goal, the "Best Choice" (to see it, buy it; start using it); Marketing and/or advertisements.

Said retrieved AKI and AK elements 7079 are formatted for delivery 7080 such as to fit the device that sent an AK trigger 7080, but if said AK request is from an identified user 7080 7081, then determine said user's preferred AK communication device(s) 7082 by means of said user's AKM delivery profile(s) 7083, and the accessible online presence 7081 of said preferred device(s) 7082, and format for that device 7080 said AKI/AK elements retrieved 7079. Said formatted message is sent 7084 and received 7085 by said anonymous user's AK trigger device or by said identified user's preferred device 7082 that is present and accessible 7081. On said receiving device 7085, said AKI and AK elements displayed 7086 (some of which may be optional) may include items such as: Header data: Sender data (e.g., address, etc.); Receiver data (e.g., address, etc.); Title data; Date/time data; Severity data (e.g., PSI, etc.). Body content data: AKI (Active Knowledge Instructions); Link(s) or other retrieval means: Next step(s); Link(s) or other retrieval means: Highest performance devices; Link(s) or other retrieval means: Advertisements/marketing; Link(s) or other retrieval means: Subscription offers or service(s); Link(s) or other retrieval means: Other resources/services; Link(s) or other retrieval means: Edit/create AKI or AK.

AKM devices—AKM Global Device Environment (GDE)—decentralized (fits some devices): Together, FIGS. 209, 210 and 211 comprise an AKM Global Device Environment (herein "GDE") whose architecture may be decentralized (FIG. 209), centralized (FIG. 210), and/or a hybrid with intermediate/transition devices (FIG. 211). Along with FIGS. 212 (add/update devices), 213 (device outbound communications), 214 (device inbound communications), and 215 multimedia message recognition and matching), these comprise a plurality of AKM communications architecture and processes. These integrate a plurality of remote devices with said AKM such that a user(s) may request, receive and act upon said AKI and AK provided by the AKM.

FIG. 209 illustrates said AKM decentralized GDE which includes remote devices that are capable of processing, storage and communication 7402 and a plurality of users in a plurality of locations 7400 7401; decentralized GDE components 7402 and distributed processes 7407; one or more networks 7416 that can communicate AK triggers, AK messages, etc. 7417 7425 to attached AKM components such as aggregation, network server(s), application(s), application server(s), AK database(s); and AK and AKI processing 7418. Said GDE components 7402 include devices 7403 with built-in or add-on processing, storage and communications, AIDs/AODs 7404, LTP's 7405/MTP's 7405, and/or RTP's 7406; where in some cases said devices 7403 may utilize AIDs/AODs 7404 for user requested AKM messaging and AK events 7415. Said decentralized GDE includes distributed processing 7407 that is programmable and updatable, and generally proceeds by means of event detection 7408, local determination of the need for AKI and/or AK 7409 with optional querying of said user(s) 7410, and optional local assignment of severity 7411 such as by means of a PSI. Said local decentralized processing 7407 produces AK triggers 7417, AK events 7417, AK event ID's 7417, and/or AK results (after receiving AKI and/or AK) 7417; which are aggregated and communicated by one or more networks 7416 that may include a network server(s) 7416, application(s) or application server(s) 7416, database(s) or database server(s) 7416, and/or users' AKM record(s) 7416. Said AKM components attached to said network(s) 7416 provide AKM processing 7418 such as determining the appropriate AKI/AK 7419, formatting and delivering said AKI/AK to a plurality of devices and/or users' AIDs/AODs 7420, and storing AK actions 7421 and (if received) result(s) 7421 by means of AK databases such as user AKM records 7423, and AK results 7424 (both raw data and ranked data). Said AKM processing 7418 produces AKI and AK messages 7425 which are received 7412, displayed on appropriate device(s) 7413, and after use by said users 7400 7401, results are determined and (optionally) sent 7414 7417 to said AKM processing 7418 for storage 7421 7424 7423.

AKM devices—AKM Global Device Environment (GDE)—centralized (fits some devices): FIG. 210 illustrates said AKM centralized GDE which includes remote devices that are not capable of processing and storage but can communicate 7428, and a plurality of users in a plurality of locations 7426 7427; remote GDE components 7428; one or more networks 7436 that can communicate AK triggers, AK messages, etc. 7434 7435 to attached to AKM components such as aggregation, a network server(s) 7416, application(s) or application server(s) 7416, database(s) or database server (s) 7416, and/or users' AKM record(s) 7416. Said AKM components attached to said network(s) 7416 provide AKM processing 7418 such as 7428 include devices 7429 that cannot provide AK processing or storage but can communicate; AIDs/AODs 7430, LTP's 7431/MTP's 7431, and/or RTP's 7432; where in some cases said devices 7429 may utilize AIDs/AODs 7430 for user requested AKM messaging and AK events 7433. Said centralized GDE does not include distributed processing, but generally proceeds by communications that may be interpreted centrally as AK triggers 7434, AK events 7434, and/or AK results (after receiving AKI and/or AK) 7434; which are aggregated and communicated by one or more networks 7436 that may include a network server(s) 7436, application(s) or application server(s) 7436, database (s) or database server(s) 7436, and/or users' AKM record(s) 7436. Said AKM components attached to said network(s) 7436 provide centralized AKM processing 7438 such as AK trigger detection 7439; AK event detection 7439; determining the appropriate AKI/AK 7440 by utilizing AKR 7441 and (if an identified user) user AKM records 7442; formatting and delivering said AKI/AK 7443 to a plurality of devices and/or users' AIDs/AODs 7443; and storing AK actions 7444 and (if received) results 7444 by means of AK databases such as user AKM record(s) 7442, and AK results 7445 (both raw data and ranked data). Said AKM processing 7438 produces AKI and AK messages 7435 which are received, displayed on appropriate devices 7428 7429 7430 7431 7432; and after use by said users 7426 7427, results are (optionally) sent 7434 to said AKM processing 7438 for storage 7442 7444.

AKM devices—AKM Global Device Environment (GDE)—hybrid with intermediate transition devices (fits some devices): FIG. 211 illustrates said AKM hybrid GDE which includes intermediate/transition devices 7454 that are capable of processing, storage and communication and a plurality of users in a plurality of locations 7446 7447; decentralized GDE components 7448 and distributed processes in 7460; one or more networks 7470 that can communicate AK triggers, AK messages, etc. 7468 7469 to attached AKM components such as aggregation, a network server(s) 7470, application(s) or application server(s) 7470, database(s) or database server(s) 7470, and/or users' AKM record(s) 7470. Said intermediate/transition devices 7454 include built-in or add-on processing, storage and communications so that when remote GDE devices 7449, AIDs/AODs 7452, LTP's 7450/MTP's 7450, and/or RTP's 7451 cannot provide this functionality, said intermediate/transition devices 7454 such as mobile devices 7455 (in some examples cell phones, pads, tablets, e-books, etc.); base stations such as for a wired LAN, Wi-Fi network, security systems, etc. 7456; wearable devices 7457 such as a PDA or "MiFi" base station, other robust sensors and/or devices 7458; or external websites 7459, web applications 7459, web services 7459, applications 7459; can provide these capabilities. Said hybrid GDE includes distributed processing 7460 that is programmable and updatable, and generally proceeds by means of event detection 7461, local determination of the need for AKI and/or AK 7462 with optional querying of said users 7463, and optional local assignment of severity 7464 such as by means of a PSI. Said hybrid decentralized processing 7460 produces AK triggers 7468, AK events 7468, AK of event IDs 7468, and/or AK results (after receiving AKI and/or AK) 7468; which are aggregated and communicated by one or more networks 7470 that may include a a network server(s) 7470, application(s) or application server(s) 7470, database(s) or database server(s) 7470, and/or users' AKM record(s) 7470. Said AKM components attached to said networks 7470 provide AKM processing 7472 such as AK trigger detection 7473; AK event detection 7473; determining the appropriate AKI/AK 7474 by utilizing AKR 7477 and (if an identified user) user AKM records 7478; formatting and delivering said AKI/AK 7474 to a plurality of devices and/or users' AIDs/AODs 7475; and storing AK actions 7476 and (if received) results 7476 by means of AK databases such as user AKM records 7478, and AK results 7479 (both raw data and ranked data). Said AKM processing 7472 produces AKI and AK messages 7469 which are received to 7465, displayed on appropriate devices 7466, and after use by said users 7446 7447, results are determined and (optionally) sent 7467 7468 to said AKM processing 7472 for storage 7476 7478 7479.

Add and/or update AKM devices: To facilitate said communications new devices may be added and/or updated by means such as new device discovery, establishing communications, validation and/or authentication, and correcting and/or updating attributes such as device identification, communications protocol, or other updates.

FIG. 212 illustrates the facilitation of communications with devices and/or transition devices by adding or updating them by means such as device discovery 7478, then establishes communications with said new device 7479. If a device's user is identifiable then said user is validated and/or authenticated 7480 (if validation/authentication fails 7481 then appropriate actions should be taken 7482 to confirm user's identity with familiar processes, or to treat said user as anonymous). By means of communication with said device 7479 the appropriate server(s) and/or application(s) should be provided with said device's data, identification, communications protocol, etc. 7483. If said device identification needs updating 7484, then transfer new device identification to said device 7485. If said device communications protocol needs updating 7486, then transfer the updated communications protocol to said device 7487. If said device needs any other update(s) 7488, then transfer said other update(s) to said device 7489. If any device update(s) failed 7490, then appropriate actions should be taken in response to failed device update(s) 7491 by utilizing known means to complete said update(s). If said device's 7479 data, identification, communications protocol, etc. do not need to be updated 7484 7486 7488, or if said device's update(s) succeed 7490, then communicate with said device via proper identification, protocol, etc. 7490.

AKM GDE devices outbound communications: FIG. 213 illustrates GDE device outbound communications, which begins with the Device in Use (herein "DIU") 7000, and proceeds on different paths depending upon said DIU's capabilities: If said DIU is capable of detecting AK events 7001 and said detection is built-in 7002, then communicate according to built-in rules 7003, and process requests for AKI/AK 7004. If said DIU is not capable of detecting AK events 7001 but intermediate or transition devices are in use 7005 7006, it needs to be determined if said intermediate or transition device can communicate 7007. If it cannot, then terminate 7023. If it can communicate 7007, then if it is not programmable 7008 communicate according to built-in rules 7003, and process request(s) for AKI/AK 7004. If said DIU is not capable of detecting AK events 7001, and no intermediate or transition device is in use 7005, then terminate 7023. If said DIU has AK event detection 7001, but does not have built-in detection 7002, then a local event detector 7009 is present that is programmable, upgradable. Also if said DIU is not capable of detecting AK events 7001 but intermediate or transition devices are in use 7005 7006, and said intermediate or transition devices can communicate 7007 and are programmable 7008, then a local event detector 7009 is present that is programmable, upgradable. Said local event detector 7009 is in a state of watching for AK events 7010, which continues when an event is not detected 7011. When an event is detected 7011, said local event detector references rules for AK notification 7012 7013, and if said AK event does not exceed the threshold (s) 7014 then said AK event detector returns to a state of watching 7010. If, however, said AK event 7011 exceeds stored rules 7012 7013 and thresholds 7014 then an optional user notice and authorization 7015 7016 may be included or skipped 7016 and event detector may process request(s) for AKI/AK 7022. Additionally, said AK event(s) may be optionally logged 7017. If said DIU is not capable of AK event detection 7001 7006 7007 and said AK processes must be terminated 7023, then said user has other AKI and/or AK options 7018. If said user does not want AKI or AK then said user options are terminated 7023. However, if said user doesn't want AKI or AK 7019 then user selects and uses an alternate DIU 7020 or an AID/AOD 7021 to make an AKI or AK request, which then processes said AKI/AK request 7022.

AKM GDE devices inbound communications: FIG. 214 illustrates GDE device inbound communications, which begins with the AKM processing said AKI/AK requests 7004 7022 in FIGS. 213 and 7024 in FIG. 214, then proceeds on different paths for inbound communications that depend on the communicating DIU's capabilities 7025. Inbound communications also includes whether said AKM device can be instructed remotely by "Direct AKI," which is the ability to download pre-set instructions that the device can carry out directly, so the device can produce user success without the user needing to follow instructions or use AKI/AK. If either said DIU 7025 or an intermediate or transition device(s) 7032 is capable of displaying AKI and AK then communicate those directly to said DIU 7025 or intermediate device 7032, but if it can use web-based links 7026 then display said AKI, AK and links 7027; act on and process said AKI, AK and links selected 7028 and send user actions and/or result(s) to AKM for logging 7029. If said DIU 7025 is not capable of displaying AKI/AK but an intermediate or transition device(s) are in use 7032 7033, and said intermediate or transition device(s) can communicate 7034 and has a usable display 7035, then a local device is a available to display AKI, AK and/or links to said user 7026. If said DIU 7025 is not capable of displaying AKI/AK and there is no intermediate or transition device in use 7033, then terminate 7043. If said DIU 7025 does not have a usable display, and there is an intermediate or transition device 7033 but it does not communicate 7034, then terminate

7043. If said DIU 7025 does not have a usable display, and there is an intermediate or transition device 7033, and it does communicate 7034, but if it does not have a usable display 7035, then terminate 7043. If either said DIU 7025 or an intermediate or transition device(s) 7032 is capable of displaying AKI and AK, but it cannot use web-based links 7026 then determine if said DIU can process "Direct AKI" 7030; and if not, then display only the AKI and AK with non-link means for said user to access said AK 7031; and send available user actions and/or result(s) to AKM for logging 7029. If said DIU 7025 is capable of displaying AKI and AK, but it cannot use web-based links 7026 then determine is said DIU can process "Direct AKI" 7030, and if yes, then provide user with the choice of operating said DIU by means of "Direct AKI" 7036; and if user declines then display said AKI and AK 7031, then send available user actions and/or result(s) to AKM for logging 7029. If said DIU 7025 is capable of displaying AKI and AK, as well as using web-based links 7026; then (optionally) determine if said DIU can process "Direct AKI" 7030, and if so, display said AKI, AK and links 7027 but also provide user with the optional choice of operating said DIU by means of "Direct AKI" 7036. If said DIU 7025 can process "Direct AKI" 7030, and said user chooses to operate said DIU by means of "Direct AKI" 7036 7037, then receive "Direct AKI" and interpret instruction(s) 7038; implement said received instruction(s) at DIU 7039; if specified, implement settings or limits to settings within said instruction(s) 7040; if present, display user instructions portion(s) of "Direct AKI" 7041; and if DIU can use Web-based links, also display a quay links and process any AK links selected 7042; then send available user actions and/or result(s) to AKM for logging 7050. If neither a DIU 7025 nor a transition device 7032 are available, said user still has AKI and/or AK options 7044, and may request these 7045 by means of an AID/AOD to request AKI, AK and/or AK links 7047. Optionally, these may be requested by means of some DIUs 7046. In this case, display said AKI, AK and/or AK links on said AID/AOD 7048; process any AK or links selected 7049; then send available user actions and/or result(s) to AKM for logging 7050.

AKM device recognition and matching: FIG. 215 illustrates AKM multimedia message recognition and matching, which enables devices, users and tasks to be recognized by multiple means that may include triggers and messages that contain and image(s), video and/or audio, or that include data such as a combination of media. Some examples include a camera phone's picture of a barcode from a device's label, a camera phone' is video of a task such as an exercise that is attempted on a cable gym, and audio reading of a product's UPC, any media-rich request sent from a subscribed user's mobile phone, etc.

Said AKM multimedia message recognition and matching begins with the receipt of said media-rich message 10260, which may be a traitor or a user request. If the AKM is able to directly recognize the device, user, task, etc. 10261. Some examples include data contained within said message 10260 such as a unique device identification, a subscribed user's unique identification or stored login, etc. in this case, said message 10260 with identification included may be passed directly to AKI/AK retrieval process(es) 10262 (including in some examples user identification, device identification, task identification, etc. If said media rich message 10260 does not include identification of device, a user, task, etc. 10261 then a range of media may be included in said message 10260 such as: An image of a device barcode 10263; An image of a device label 10264; An image, video or audio description of a device, user, task, etc. 10265; An image, video or audio description of a task being performed 10266; Media data from an RTP in or next to a device or user 10267; Other types of media-based messaging that may include elements such as those listed above 10263 10264 10265 10266 10267 10268 as well as other types of media-rich communications.

In some examples said media rich message is parsed 10270 for identification(s) by means of scanning; in some examples said media rich message is parsed 10270 for identification(s) by means of OCR; in some examples said media rich message is parsed 10270 for identification(s) by means of voice recognition; in some examples said media rich message is parsed 10270 for identification(s) by means of other recognition process(es); in some examples said media rich message is parsed 10270 for identification(s) by means of a separate system(s) from said AKM, integrated within a system or component within said AKM or separate from it; etc. Once parsed 10270 said identification(s) are utilized to retrieve appropriate AKM records 10271 such as if the user is identifiable 10272, and if not then treat said AKI event as anonymous 10273. If said user is identifiable 10272, then if that device, task, etc. is on said user's list(s) 10274 in said user's AKM record(s), provide the appropriate member or subscriber features 10275 to that combination of user, device, task, user goal(s), etc. if said device is not on said user's list(s) of devices 10274, then (optionally) provide an interaction for said user to add said device to user's list of devices and/or tasks 10276, and if user agrees branch to FIG. 212 10277. After available AKM records are retrieved 10271, proceed with AKI/AK retrieval including available identification(s) of user, device, task, subscription benefits, etc. 10278. Alternatively, either the AKM, said user or both may browse or search AKM records directly for a device, user, task, etc. 10268. In some examples said browsing or searching may be interactive wherein either the AKM or said user utilizes said media (such as an image or video from a visual device and/or an AID such as a mobile phone with a camera, an RTP, spoken audio with voice recognition identification, etc.) to match said media's content with one or more AKM records 10268. After available AKM records are retrieved 10268, proceed with AKI/AK retrieval including available identification(s) of user, device, task, subscription benefits, etc. 10278. If message parsing is not successful 10270 and browsing or searching are also unsuccessful 10268 then branch to FIG. 237 for error correction 10269.

AKM triggers—AKM triggers hierarchy and process: FIG. 216 illustrates the AKM's repetitive and efficient means to process a hierarchy of triggers throughout AK interactions that are under user control and may include both primary and multiple optional steps. At a high level, two of the main types of AK requests include AK requests by a device 7500 and AK requests by a user 7506. In response, said device or user receives AKI and/or AK 7512 and utilizes them under user control. Then, optionally, other forms of AK received may also be used under user control, such as AK next step(s) 7518, AK best option(s) 7524, AK advertising or marketing 7530, or other types of AK triggers 7536 that provide other types of AK 7537. In somewhat more detail, said AKM triggers processing includes:

AK request by a device 7500: A main type of AK request is when a device sends a trigger 7501 and the AKM (such as an AK system) receives and processes said trigger 7502 by means of utilizing data within said trigger to recognize components such as the device, user, task, etc. 7503. Based on said recognized components 7503, said AKM selects the appropriate AKI/AK 7504 and formats said AKI/AK into an appropriate message 7504 to fit said requesting device 7501, and then sends said formatted message to said device 7505.

AK request by a user 7506 (prospect, customer, user, intermediate or transition device, etc.): A second main type of AK trigger is when a user sends an AK request 7507, which may be from requestors such as a prospect, customer, subscriber, user, intermediate or transition device, etc. who are utilizing an AID/AOD or an intermediate or transition device. The AKM (such as an AK system) receives and processes said AK request 7508 by means of utilizing data within said trigger to recognize components such as the device, user, task, etc. 7509. Based on said recognized components 7509, said AKM selects the appropriate AKI/AK 7510 to fit said requesting user's AID/AOD 7507 and formats said AKI/AK into an appropriate message 7510 to fit said requesting user's AID/AOD 7507, and then sends said formatted message to said device 7507.

AKI and/or AK are received and used 7512: When received said AKI/AK message 7504 7510 7513 is displayed on the appropriate device 7501 or communicating AID/AOD 7507, and if (optionally) not used then this AK event is ended 7514 under user control. Alternatively, if said AKI and/or AK are used by said user and/or by said device 7515 then results may be (optionally) sent to the AKM 7516. At that point, under user control, said AK event may be ended 7515 or said user may choose to use more of said AK received 7517.

(Optional) AK next step(s) 7518: A main type of AK is AKI for the next step(s) in a task 7519 and access to this may be provided by means of links or another type of requesting trigger such as a button press in a visual interface, an icon or words on a touchscreen such as a mobile phone, a voice command in any type of voice recognition system, etc. By any of those means, said user may request said next step(s) AK 7519, in which case said AKM (such as an AK system or another system which in some examples may be provided by a third-party) receives and processes said trigger 7520; then selects, formats and sends said next step(s) AK 7521 (which in some examples may be steps or options such as marketing or sales actions provided by a third-party and/or a third-party system). After being received and displayed 7522, (optionally) this AK might not be used, and then this AK event is ended; but alternatively, if said next step(s) AK is used then results may be (optionally) sent to the AKM 7522. At that point, under user control, said AK event may be ended 7523 or said user may choose to use more of said AK received 7523.

(Optional) AK best option(s) 7524: Another main type of AK is the name(s) and buying option(s) to select and/or purchase one or more devices that provide the best known performance for the user's task 7525, and access to this choice may be provided by means of links or another type of requesting trigger such as a button press in a visual interface, an icon or words on a touchscreen such as a mobile phone, a voice command in any type of voice recognition system, etc. By any of those means, said user may request said best choice (s) AK 7525, in which case said AKM (such as an AK system or another system which in some examples may be provided by a third-party) receives and processes said trigger 7526; then selects, formats and sends said best choice(s) AK 7527 (which in some examples may be steps or options such as marketing or sales actions provided by a third-party and/or a third-party system). After being received and displayed 7528, (optionally) this AK might not be used, and then this AK of event is ended, but alternatively, if said best choice(s) AK is used then results may be (optionally) sent to the AKM 7528. At that point, under user control, said AK event may be ended 7529 or said user may choose to use more of said AK received 7529.

(Optional) AK advertising or marketing 7530: Another main (though optional) type of AK is sponsored advertising or marketing 7531, and said advertising or marketing message (s) may be received and displayed in whole or in part as one component of said AKI/AK message 7513 7514, and access to this choice may be provided by means of clicking on said message, links, or another type of requesting trigger such as a button press in a visual interface, an icon or words on a touchscreen such as a mobile phone, a voice command in any type of voice recognition system, etc. By any of those means, said user may make a request based on said advertising or marketing information 7531, in which case said AKM (such as an AK system or another system which in some examples may be provided by a third-party) receives and processes said trigger 7532; then selects, formats and sends the advertising or marketing information 7533 (which in some examples may be steps or options such as marketing or sales actions provided by a third-party and/or a third-party system). After being received and displayed 7534, (optionally) this might not be used, and then this AK interaction is ended, but alternatively, if said advertising or marketing information is used then results may be (optionally) sent to the AKM 7534. At that point, under user control, said AK event may be ended 7535 or said user may choose to use more of said AK received 7535.

(Optional) Other triggers 7536 with other AK processing 7537: As described other types of triggers are possible such as examples, how-two videos, edit or add AKI/AK, subscription offers, other types of information, etc. Access to these may be provided by means of links or another type of requesting trigger such as a button press in a visual interface, an icon or words on a touchscreen such as a mobile phone, a voice command in any type of voice recognition system, etc. By any of those means, said user may request said other types of triggers and 7536, in which case said AKM (such as an AK system) receives and processes said trigger 7537 by means similar to that described above; such as by selecting, formatting and sending AK. After being received and displayed said other triggers' AK are also used similarly to that described above 7512 7518 7524 7530; that is (optionally) this AK might not be used and then this AK event is ended; but alternatively, if said AK is used then results may be (optionally) sent to the AKM. At that point, under user control, said AK event may be ended or said user may choose to use more of said AK received.

AKM triggers flow: FIG. 217 illustrates the processing of said AKM triggers by means of monitoring a plurality of device(s), user(s) and/or triggers 7582, with said monitoring including error identification, logging and correction 7592. Triggers monitoring 7582 begins by defining an active triggers list 7583 such as generated and sent to a device(s) or user(s) 7512 7518 7524 7530 7536 in FIG. 216, then monitoring said trigger's 7584. Based on the types of triggers in said defined list 7583 a timer(s) is started 7586 with varying length(s) for each type of trigger(s) sent. If a trigger is used and received 7587, then said trigger is processed 7589 and the appropriate AKI/AK is sent in response to the trigger(s) received 7589. Based on that newly sent AKI/AK 7589, a new active triggers list is defined 7590 or updated 7590 and said the new list of triggers is monitored 7584, with said trigger(s) monitoring process 7582 repeated as long as triggers remain active. If a monitored trigger(s) is not received 7587 after said predefined timer(s) has run 7588, then said non-received trigger expires and said defined active triggers list is re-set to a smaller trigger(s) list 7588 for monitoring 7584.

Simultaneously, error identification, logging and correction 7592 take place by determining when an active trigger monitoring service has terminated 7593; that is, when it is no longer monitoring the plurality of active triggers in its defined active triggers list. The execution of said failed active trigger monitoring is reactivated 7594, and an error message is generated 7595 with appropriate or available details for logging, correction, or other action. Based on the type of error 7596, said error 7595 may be corrected by the process in FIG. 212 if a communications error; or the error management and correction process in FIG. 237 if a recognition, look up, storage, navigation, I-A, hierarchy, content, etc. error; or by the error handling 7319 in FIG. 202 if a search error, or by other types of error processing 7598 such as that provided by a third-party or a different AKM system with whom said error is associated.

AKM triggers self-service management and options: FIGS. 218 and 219 illustrate AKM triggers self-service management and options so that and identified user(s) can manage AKM triggers. At a high-level, this is done by means of opening said user's AKM record(s) 7548 7550 7551 in FIG. 218, selecting a trigger(s) to edit 7557 7560 in FIG. 219, including adding and deleting devices such as AIDs/AODs 7572. Said AKM triggers management has as its context the AKM process, namely AK use 7540 wherein a device or user sends a trigger 7541; the AKM receives said trigger, retrieves appropriate AKI/AK and sends it 7542; said AKI and/or AK are used 7543; (optionally) result(s) from use are sent to the AKM 7544; and AK use is ended 7545 or else (optional) more of the AK received is used 7545 under user control. From a link or other means in said AK use(s) 7540, or by other means a user(s) requests management of said user's triggers 7549 or said user's AKM record(s) 7549. After normal authentication and authorization the AKM opens said user's AKM record(s) 7550 7554 for editing 7551. After said edits are received and confirmed 7552 and storage and in said user's AKM record(s) 7552 7554, said use of AK triggers management is ended 7553. Said edited and updated trigger(s) is then utilized for said user's AK processing 7542.

When said AKM opens said user's AKM record(s) 7550 7554 for self-service editing 7551 and 7556 in FIG. 219, an initial step is for said user to select a trigger(s) to edit 7557, by means of a display of available triggers by group(s) 7558, or in an ungrouped list 7558. If grouped in, user selects a triggers group, then a trigger(s) to edit in a group 7559, or if ungrouped user selects the trigger(s) to be edited. A trigger(s) is edited 7560 by displaying editable options for that trigger 7561 such as: Edit trigger threshold(s) 7562; Edit AKI level of detail sent to user 7563; Edit "Direct AKI" action on or by device(s) 7564 if available for said device; Edit which other AK is wanted or not wanted 7565 such as, in some examples triggers related to QOL options 7395 in FIG. 206; Edit or update user's AID/AOD devices 7566; Edit other notifications to said user 7567 such as alarms, events, periodic messages, etc.; Edit other trigger(s) options 7568.

After completing the edit of said trigger(s) 7560, user may select another trigger(s) to edit 7569, or end triggers editing 7569 and 7553 in FIG. 218. As part of editing or updating said user's AID/AOD devices 7566, user may add/edit/delete a device 7570 and/or an AID/AOD 7570. If a user does not choose to delete a device 7571, and does not choose to add a device 7573, and does not choose to edit a device 7576, then said add/edit/delete device process ends 7580. If a user chooses to delete a device 7571 said device is removed from user's AKM record(s) 7572. If there are more devices to add/edit/delete then said process continues and user may add a device 7573 and if so, said device is added by means of entering said user's name for said device 7574, entering login information (if needed) for said device 7574, and entering any other data needed to communicate with said device 7574, then testing AKM communication with said device 7575 and fixing as needed (as described in FIG. 212). If there are more devices to add/edit/delete then said process continues and user may edit a device 7576 and if so, said device is edited by means of making edits to previously entered data for said device 7577. If there are more devices to add/edit/delete 7578 7579 then said process loops and continues 7571, but if said add/edit/delete device is completed, said process is ended 7580.

AKM automated alerts: AKM alerts may be user-set as illustrated in 7557 7560 in FIG. 219, in 7645 in FIG. 223, editing other notifications such as alarms, events, etc. 7567 in FIG. 219, etc. which show means for alerts that are under user control; or alerts may be automatically determined as FIG. 220 illustrates. Automated determinations may be based on various metrics, such as those described in FIG. 198 (AKM performance analysis and escalation), in FIG. 199 (AKM analysis and comparison), etc. FIG. 220 illustrates said AKM automated alerts, notifications and messaging that may apply to free and anonymous usage, or to identified users such as subscribers or those who pay for services from the AKM or third parties. Said FIG. 220 includes the automatic identification of alerts 10020, appropriate recommendations for both users and third parties 10030, and alert services 10031. The identification of potential alerts, notifications and messages 10020 is based on a plurality of types of metrics and events; these may include various metrics with some examples including:

Performance metrics 10021: Performance metrics relate to any task or goal and the success/failure rate of a user in comparison to the average rate of success, such that an AK event(s) falls sufficiently below or above said average rate of success (e.g., depending on use and need, "average" may be the mean, the median or the mode).

High-value metrics 10023: For identified users with a user AKM record(s) with one or more personal goals set, and/or other means that identify personal priorities (such as what is tracked by a personal dashboard as in FIG. 225 or a personal report as in FIG. 223), said goal(s) or metric(s) may be utilized to compare said identified user's success/failure rate in comparison to the average rate of success for each of those goals or metrics.

Critical metrics 10025: Critical metrics relate to activities that require a high rate of success or else failure may cause a person sufficient damage or harm to exceed a threshold. Some examples include the use of health monitoring devices such as insulin level monitoring for diabetes patients, driving a large vehicle at a high rate of speed, etc. Said critical activities may have AK events tracked to confirm that a user's success/failure rate is appropriate for the minimum rate of success required during one or a plurality of tasks, or does not exceed a threshold that triggers an alert, notification, message, etc.

Multiple metrics 10027: Combinations of metrics may also be identified and treated together as one bundle of AK events, which reduces the number of user contacts (compared to a separate user interaction for each potential alert) while making it possible to raise the impact of fewer user AK communications.

The identification of alerts 10020 is processed such that if there is no low performance metric 10021 that falls below an alert threshold, and there is no low high-value metric 10023 that falls below an alert threshold, and there is no low critical metric 10025 that falls below an alert threshold, and there is no low multiple metrics 10027 that falls below an alert threshold, then said process of identifying alerts ends 10029. If a low performance metric is identified 10021 then a potential alert is determined and recommended 10022, which may include notifying said user 10022 to recommend monitoring of said task and metric(s), with an AK alert(s) and/or an AK delivery(ies) or service(s) at a low performance threshold; and if one or a plurality of choices are accepted by said user, then creating an identified user AKM record(s) for said new alert(s). If a low high-value metric is identified 10023 then a potential alert is determined and recommended 10024, which may include identifying said user, recommending monitoring of said goal(s) and/or metric(s), with a AK alert(s) and/or a customized AK delivery(ies) or service(s) at a recommended threshold, recommending additional service(s) from a third-party, or other choices; and if one or a plurality of choices are accepted by said user, then creating or updating said user AKM record(s) for said alert(s). If a low critical metric is identified 10025 then a potential alert is determined and recommended 10026, which may include identifying said user, recommending monitoring of said activity(ies), with an AK alert(s) and/or an AK delivery(ies) or service(s) at a recommended threshold, recommending additional service(s) from a third-party, or other choices.; and if one or a plurality of choices are accepted by said user, then creating or updating said user AKM record(s) for said new alert(s). If multiple metrics are identified 10027 then a potential alert is determined and recommended 10028, which may include identifying said user, identifying a bundle of metrics with their associated devices, tasks and activities; recommending monitoring of said bundle, with an AK alert(s) and/or an AK delivery(ies) or service(s) at a recommended thresholds, recommending additional service(s) from a third-party, or other choices.; and if one or a plurality of choices are accepted by said user, then creating or updating said user AKM record(s) for said new alerts.

Potential alerts 10031 are initiated by communicating with a user 10034 to make a decision regarding proposed alert(s) 10022 10024 10026 10028, and if user declines then said automated alert(s) process ends 10033. If a third-party is included 10032 as appropriate for providing AK alerts, notifications and/or messages then communications with said third party(ies) 10032 to provide this service(s), and if third-party declines then said third-party participation ends 1033. If said third-party(ies) 10032 accepts then an offer, such as marketing communication(s) is sent to said user 10032. If user accepts either said AKM alerts communication(s) 10030 and/or said third-party marketing communication(s) 10032 then service is added. If a paid service 10035 then process payment and add said alert(s) service(s) 10035 and start said AK alert, notification and/or message service(s) 10037. If a free service 10036 then update said user's AKM record(s) 10036 and start said AK alert, notification and/or message service(s) 10037.

AKM reporting and dashboards: To assist with improving success and satisfaction the AKM produces visible results by means of various types of individual, group, category and/or public reports and dashboards as in FIGS. 221 through 227. Said reports and dashboards include a flexible range of metrics, data, sorting and filtering, including the ability for a plurality of individual users to run a range of reports and dashboards, modify and save them as customized versions, and automatically have said visible results information displayed and/or delivered as needed. Said reports and dashboards may include links to other AK performance data such as "best choice" options along with means to buy, use or see said "best choice" alternatives 7621 7645 7681 7684 7695 7696 10241. They may also include vendor reports that show "best choice" alternatives 10241 in FIG. 227 and the current device's issues. Thus, said AKM reports and dashboards serve to surface current performance, the gap between each person's or group's current performance and best available results, with a direct route to switch to the best available choice or improve it's design and development. In sum, AKM reports and dashboards constitute a structured system for moving at scale, by both customers and vendors, from current performance levels to a higher performance level that is possible at any time, such that when performance leaps forward in any area those advances are rapidly visible with potentially large numbers able to see when and if they "fall behind", along with how to leap ahead as "fast followers" by switching to the choice(s) of those who are more successful.

FIGS. 221 through 227 disclose some examples for AKM reporting and dashboards that include a range of reporting and business intelligence technologies. In the examples the components may consist of any combination of devices, components, modules, systems, processes, methods, services, etc. at a single location or at multiple locations, wherein any location or communication network(s) includes any of various hardware, software, communication, security or other components. A plurality of reporting applications, reports, dashboards, alerts, etc. that incorporate examples may be constructed and included or integrated into devices, applications, systems, components, methods, processes, modules, hardware, platforms, utilities, infrastructures, networks, etc., in some examples including separate or third-party system(s) or machine(s). In some examples known reporting and dashboard capabilities include display features such as advanced charts, gauges and indicators, tables, scorecards, strategy maps, etc.; in some examples known reporting and dashboard capabilities include functions such as advanced monitoring, drill down to data analyses, monitoring of metrics, monitoring of tactics, monitoring of strategies, alerts, interactive data deliveries based on thresholds, etc.

AKM reports calculation: FIG. 221 illustrates some examples of an AKM's reports and dashboard calculation process 7600, which begins with the selection of a report, dashboard, reporting template, performance metric, device, etc. 7601. The parameters and scope of said report or dashboard are then selected 7602 which may include, in some examples, a device(s), QOL goal(s), geographic region, time period, etc. If set for automatic running 7603 then said report or dashboard may have been previously calculated and may then be viewed, looked up, or displayed on demand. If not previously calculated, then said report or dashboard is run manually 7603, which may require retrieving the appropriate data, calculations, formatting, display and delivery. Whether previously calculated 7603 or manually calculated on demand 7603, said report or dashboard is calculated 7604 at the appropriate time(s) by retrieving various AK data from various sources: AK results (ranked data) 7605; Group(s)' AK results (ranked data) 7606; AK results (raw data) 7607; User AKM record(s) 7608.

Anonymous users 7604 must either use previously calculated reports and dashboards 7603, or select 7601 and construct 7602 each report or dashboard on demand when results information is needed. Identified users 7604 may save said reports and dashboards to their AKM record(s) and receive them as needed as collected measures sets in both an initial baseline(s) and as subsequently collected measures sets in updated baseline(s) that may be compared to said an initial baseline(s) 7376 7382 in FIG. 205. An individual report or dashboard includes a range of AK metrics data collected 7609 7610 7611 that may be direct metrics such as a rate of success or task breakdown points listed with the most frequent first, or indirect and derived metrics such as efficiency or switching cost (to the "best choice" alternative). When said report or dashboard is calculated, calculation results are stored 7612 such as by identified user(s), metric(s), device(s), QOL goal (s), etc. so that a range of AK reports are previously calculated 7603 and available for on demand selection and display 7601. When a report or dashboard is displayed and reviewed 7613 it may be changed, re-run and (if an identified user) saved 7613 7608. When said user(s) finishes selecting, running, displaying and using said reports or dashboards then said process ends 7614 7615, but if said user wants to continue 7614 then said reports and dashboard process loops 7601.

AKM reporting—anonymous users: FIG. 222 illustrates AKM reporting by user-selected category(ies) for anonymous users 7616 by means of reports that are pre-calculated and retrieved with said anonymous user's data added for comparison at run time, or by means of on-demand reports that are run and calculated when requested. Said AKM reporting by category(ies) for anonymous users may include components such as: Report title 7624. Report display resizing may be provided by multiple means such as minimizing the report to a small size or icon 7630, maximizing the report to a large(st) size 7630, closing the report 7630, scrolling the report to see its various content and information 7633, and/or resizing the report size (width and/or height) 7638.

Navigation to what is reported 7617 7618 7619 7620: Navigation title 7617 such as a device category like "Digital point-and-shoot cameras" or a device name like "Nikon Coolpix S52c Camera". Navigation widget 7618 such as a "tree" which is typically a vertically stacked list in which either sections open one at a time while closing the other sections, or in which two or more sections may be open at the same time. Navigation highlighting or identification of the item selected 7619 in said navigation such as a product (like a "Nikon Coolpix S52c"), which (in this report layout) said device name is also listed in the main center report title 7627 and in the top center tab navigation 7626. Means to scroll or access a longer list 7620 if said navigation provides more choices than can be displayed.

Means to access additional AK 7621 that applies to said selected device 7619, some examples of which may include: How to succeed (AKI): Goes directly to available AKI for said selected device; may be a list of tasks and steps that each have AKI content (such as tasks and steps that are stored such as in use 7216, basic uses 7217, advanced or expanded uses 7218, applications and tasks 7219, other 7228 in FIG. 197; or may display said actual AKI content. Most successful product (s) known: Shows the AK "best choice(s)" for user success in a device's category. How to improve: Goes to available AK for said selected device and/or tasks done with said device. Related QOL Goals: May display a list of QOL goals (which may be sorted such as by most frequently chosen first) associated with said selected device (such as "family photography", "vacation photography", etc.). Etc.

Means may be included for report users to provide feedback, ratings and improvement suggestions 7622: One or more advertisements may be displayed in reports 7625 7623; and said advertisements may be run by vendors whose device (s) compete directly with said selected device(s) 7619 7627 whose AK report is displayed 7616. Tabs 7626 or another similar navigation widget provide (top center) high-level navigation for categories that may display the device name that (in this report layout) is listed and highlighted in the left navigation 7618 7619, and the same device name which is listed in the top center report title 7627. Generally, the currently selected tab is highlighted 7626 while the other tabs are clickable; when another tab is clicked, it becomes the highlighted tab. For consistency, this top center navigation (tabs in this layout) may include the same items as in the left navigation; that is, the selected device 7619, and means to access additional AK 7621 that applies to said selected device (in the same order in this layout) such as the device name as the first tab's label, then "How to succeed", "Most successful product", "How to improve", "Related QOL goals", etc.

The report title may be placed at the top center of the body of the report 7627 to state the focus of the report which (in this report layout) is the device name that is listed 7627; for consistency, this same name is highlighted in the left navigation tree 7618 7619, and named in the top center tab 7626.

A selection and input zone 7628 permits users to specify the report's settings or parameters without needing to be familiar with which report data selections are required or how to use the report engine's syntax, such as (in this layout) selecting: Said selection and input zone 7628 may employ various formats, functions and designs which in this layout parallels a radio button that provides for selecting one row (such as geography) and one level within said row (such as the world). Geography: Areas may include the entire world, a region, a country, a group or region within a country (such as a state), or another person. Products: In addition to selecting products by brand and model (which is done in the left navigation in this layout), said top center selection may provide means for selecting only the best performing products, average products, or the worst products in order to show the size of the gap(s) between the user's current product and that selected group. Users: In this area a user or may want to compare him/herself with the most successful users, with average users, or with the least successful users. Etc.

The report content is provided by employing any reporting and dashboard means such as a distribution graph 7631 (which in this layout includes the performance of the user running said report), a quintile graph 7632 (which in this layout includes the performance of the user running said report), a sortable data table 7634 7635 7636, other areas of reporting 7637, etc. In some examples content includes: Distribution graph 7631: One type of graph is a distribution in which the variables may be the number of users (y axis) and their rate of success (x axis), showing the full range of results specified in the selection and input zone 7628; additionally, the performance of the user running the report may be displayed ("You" in said distribution graph 7631) to show said user's current performance and the gap between that and best available results. Quintile (quartile, another grouping such as highest 25%/average 50%/lowest 25%, etc.) graph 7632: Another type of graph is a quintile (or other groupings) which separates low performing groups from high performing groups by utilizing variables such as the rate of success (y axis) and quintile number (x axis); and can show where the performance of the user running the report falls ("You" in said quintile graph 7632; which illustrates whether said user is in a low performing group, a high performing group, or at an average level in the middle). Sortable data table 7634 7635 7636: Data tables present information in a grid where the high-level view 7634 may be selected from an overall selector such as frequency or severity; the detailed data may be sorted by a column 7635; and the meaning of the information is clear by reading each row, such as "Task B, Step-2" which are spelled out in words in an actual report and provide a link(s) to additional AK 7636 such as "Quick tour and AKI", "Watch a quick tour", "AKI instructions", etc. Etc. Additional types of reported information 7637: Other types of direct and indirect metrics may be reported such as efficiency, switching to the best choice, etc.; In some examples switch to "best" 7637 means the estimated cost to switch to the best known (most successful) device, which is calculated by adding performance savings from using the most successful device at a success rate supported by using AKI and AK, then subtracting the cost of failures on the current device(s), and the cost of buying the best available product; which together permits estimates of impact, value, etc. of switching to "the best" known choice(s).

AKM reporting—identified, subscribed and/or paid users: FIG. 223 illustrates AKM reporting by identified users 7640 for multiple categories 7652 by means of reports that are pre-calculated and retrieved with said identified user's data added for comparison at run time, or by means of on-demand reports that are run and calculated when requested. Said AKM reporting by category(ies) for identified users may include components such as:

Navigation to what is reported 7641 7642 7643 7644: Navigation title 7641 such as a device category like "Digital point-and-shoot cameras" or a device name like "Nikon Coolpix S52c Camera". Navigation widget 7642 such as a "tree". Navigation highlighting or identification of the device selected 7643 in said navigation such as a product (in some examples a "Nikon Coolpix S52c"). Means to scroll or access a longer list 7644 if said navigation provides more choices than can be displayed.

Tabs 7651 or another similar navigation widget may provide top center high-level navigation for categories that display the device name that (in this report layout) is listed and highlighted in the left navigation 7642 7643, and the same device name which is listed in the top center report title 7653.

The report title may be placed at the top center of the body of the report 7653. Means to access additional AK 7645 that applies to said selected device 7643, some examples of which may include: Set your goals and metrics: Identified users may set their individual goals and metrics and save that to their user AKM record(s); see FIGS. 205, 206, 226, 243, 244, 245, 246, etc. Most successful product. How to succeed (AKI). How to improve. Etc.

Means may be included for report users to provide feedback, ratings and improvement suggestions 7646. One or more advertisements may be displayed in reports 7647 7648 and said advertisements may be run by vendors whose device (s) compete directly with said selected device(s) 7643 7651 whose AK report is displayed 7640.

A selection and input zone 7652 permits users to specify the report's settings or parameters without needing to be familiar with which report data selections are required or how to use the report engine's syntax, such as (in this layout) selecting: Said selection and input zone 7652 may employ various formats, functions and designs which in this layout parallels a checkbox list with pulldown selectors that provides for selecting one row (such as products) and one level within said row (such as average performing products). Geography: Multiple areas may be listed, and in this case a company is selected. Products: In this layout products are selected by brand and model in the left navigation; in this zone comparisons are selected with products of varying levels of performance such as the best performing products, average products, and the worst-performing products. Users: In this layout comparisons are selected with users of varying levels of performance such as the most successful users, average users, or the least successful users. Time: Because this report is run by identified users whose performance may be tracked and stored over time, data is available for constructing reports that show varying time periods, which in this layout include today, this week, this month, this year, or since the user started.

The report content is provided by employing any reporting and dashboard means such as a distribution graph 7654 (which in this layout includes the performance of the user running said report), a quintile graph 7655 (which in this layout includes the performance of the user running said report), a sortable data table 7657 7658 7659, other areas of reporting 7660, etc.; said report content includes: Distribution graph 7650: Because the graphs show the group selected 7652, the rate of success may be increased by utilizing AK, so this graph illustrates a company's year-to-date performance that is more successful because of its company-wide culture of using AKI and AK; similarly, this identified user's rate of success is skewed to the high-end by utilizing the AKM. Quintile graph 7655: Again, said identified user's rate of success is illustrated as high because of the use of AK. Sortable data table 7657 7658 7659: In this data table the high-level view 7657 utilizes the "Severity" overall selector; the detailed data is sorted by the "Number failed" column 7658; and the meaning of the information is clear from reading each row, and additionally explained by utilizing a link(s) to additional AK 7659 such as "Watch a quick tour". Etc.

Additional types of reported information 7660: A plurality of types of direct and indirect data may be reported which in this layout includes efficiency, switching cost, projection(s), etc.; in some examples, Efficiency 7660 means calculation(s) by known and/or standard efficiency measures that do not include time on task (in some examples various formulas may compare metrics such as total successes against total trials), and may include reporting by line graphs that show data over time such as whether efficiency increases or decreases as a result of use and the employment of AKI and AK).

AKM dashboards—anonymous users: FIG. 224 illustrates AKM dashboards for anonymous users by means of dashboards that are pre-calculated and retrieved for display 7664, or by means of on-demand customization(s) 7667 that are selected and calculated when requested. Said AKM dashboards for anonymous users include multiple modules such as: Dashboard title and/or logo and tagline 7662. Identified users may login and use said dashboard(s) as comparisons with their own stored AKM results data 7663.

AK summary module 7664: This module provides summary AKM data such as: (the totals from worldwide data could be in the millions; they also might total over 100% because individual users may have multiple memberships, devices, and types of usage such as some anonymous and some identified). Total numbers of AKM users: Anonymous users, free members/subscribers, paid members/subscribers, members of third-party services, etc. Frequency of AKI and AK uses: Total uses per day (either on an average day or for the most currently available day); average usage by heavy, moderate or light users of AKI and AK, etc. Switching to "best choice(s)" available: AKM impact on assisting users to move to the highest performance levels (either on an average day or for the most currently available day) such as request for "best choice" options, pre-purchase research into said options, actual orders placed for "best options", usage of the new "best options", performance improvements actually achieved, etc. Each of this module's data rows (in this layout) may be clicked on to drill down and examine that row's data in more detail.

Means may be included for dashboard users to provide feedback, ratings and improvement suggestions 7666.

A selection and input zone 7667 permits users to specify the dashboard's settings or parameters without needing to be familiar with which dashboard data selections are required or how to use the dashboard engine's syntax, such as (in this layout) selecting: Selection module title 7667. Multiple filters or selectors 7668 such as choose a device (Filter 1 in this layout) and/or choose a geographic region (Filter 2 in this layout). Capability to add or remove modules 7674. Capability to save said customized new dashboard(s) 7673.

AK success funnel module 7669: This module provides summary AKM usage data such as (in this layout) worldwide for the latest 30 days. This module illustrates one possible way to break down a complex set of steps into a more direct visual process, with the ability to examine the results of each step in said funnel. In some examples this illustration is a funnel process that begins with the total number of AK requests, the number of actual AK uses, the number of user successes produced by AKI and AK deliveries, the number of “best choices” lookups, the number of orders placed for said “best choices”, etc. Each of this module’s data rows (in some examples layout) may be clicked on to drill down and examine that row’s data in more detail. Each row may also have an indicator (in some examples layout) that shows the number’s change from the previous time period 7676, which in this layout is a green arrow head pointing up for a larger number, or a red arrow head pointing down for a smaller number. In other words, some AK examples may provide one or a plurality of ways to visually illustrate various results from AKI and AK deliveries, along with the overall movement toward the “best choices” available.

AK activity module 7672: This module provides detailed AKM usage activity such as (in this layout) worldwide, for the latest day available (yesterday). This module shows one way to provide detailed AKM usage data that breaks down AKI and AK deliveries during uses of devices with the ability to drill down and examine each detailed activity. This module’s detailed AKM data includes three areas: Devices life cycles (similar to the life cycle in FIG. 197) including stages such as pre-purchase finding, buying (obtaining), initial installation and setup, using, troubleshooting and problem solving, etc. AKI during use of said devices including steps such as the number of AKI requests, how often that delivered AKI was seen, how often that AKI was used successfully, the AKI “bounce rate” (that is, the frequency of receiving but not using said AKI; which is different than the failure rate where AKI was used but did not produce a success), how often next step AKI was requested, etc. AK usage as part of or after AKI/AK deliveries includes two main categories of steps; first is switching to “best choices” with steps such as requesting best choices, looking up best choices information, and ordering a best choice; second is the overall understanding of AK use including steps such as the total number of AK requests, the number of times AK was received, how often AK was retrieved from Websites, how often AK was retrieved as download documents, the total number of uses of all AK received, etc. Each row may also have an indicator that shows the number’s change from the previous time period, which in this layout is a green arrow head pointing up for a larger number, or a red arrow head pointing down for a smaller number. Each of this module’s data rows (in this layout) may be clicked on to drill down and examine that row’s data in more detail.

AK financial KPI’s module 7677: KPI stands for Key Performance Indicators, so this module provides financial data on both costs and revenues. Cost data 7677 may include cost per AK event, AK request, AK use, AK success, etc. such as other types of costs incurred by the AKM. Revenue data 7677 may include revenue per “best choice” request, “best choice” look up, “best choice” order, etc. such as other forms of revenue(s) received by the AKM. Said financial KPI’s may be in any currency, and in this layout is listed in US Dollars (USD).

Modules may be displayed as closed 7679: In some examples a module that displays the “Top 10 QOL goals” and their rate of success 7679 is displayed closed, and may be opened to see its data by clicking its “open” icon 7680.

Top 10 third-party vendors module 7681: This module provides data and drill down on current vendors by their rate of success; in some examples the drop down list selector 7683 indicates that these are displayed by the top 10 categories, and the table below that 7684 displays columns for: Each category’s rank (#). Category name (Service such as e-retail, financial, travel, etc.). Current rate of success (% Suc.). A scroll bar on the right of the table to see additional data in this top 10 list.

One or more advertisements may be displayed in dashboards 7686, and said advertisements may be run by vendors whose device(s) compete directly in any product category displayed in the dashboard, or with any device(s) selected 7668 as a main focus of the dashboard’s data.

Dashboard modules controls 7674 7681 7675 7680 7678 7682: Add/remove modules 7674: Modules may be added or removed by selecting this; modules are constructed by utilizing standards such as Web widgets, gadgets, modules, etc. constructed by means such as DHTML, JavaScript, Adobe Flash, etc. and may be provided by the AKM or by third-parties. Module title and parameters 7681: Each module has a main title such as “AK success funnel” 7669, and may also have a subtitle that lists parameters or attributes such as “Worldwide, This month” 7681. Minimize (close) module 7675: If a module is open it to may be minimized to its title only by clicking an icon on the title bar such as a down-pointing arrow head 7675. Open module 7680: If a module is minimized or closed it may be opened to its full size by clicking an icon on the title bar such as an up-pointing arrow head 7680. Details or drill down 7678: Drill down to details may be accomplished by means such as clicking a details button 7678, or by clicking an individual row 7664 such as “Total AK users”. View list or view graphic 7682: Modules may be viewed graphically or as a text list (or tabular list/grid) by means of an interactive button or widget 7682, etc.; some examples include a list(s) 7664, a table 7684, a graph 7696 7090, etc. in FIG. 225.

AKM dashboards—identified, subscribed and/or paid users: FIG. 225 illustrates AKM dashboards for identified, subscribed and/or paid users that are customized on demand by means of selections 7690 and filters 7693 when requested. Said AKM dashboards for identified users provide the in-use know-how required to make substantial personal or group improvements in performance and success. In some examples the dashboard in FIG. 225 illustrates the transformation from abundant energy to reduced energy use accomplished by making large changes in devices, products, services, applications, personal goals, entertainment, education, etc.—without making substantial reductions in one’s quality of life. Major behavior, product, new device use, etc. transformations like these require rapid interactive knowledge by large numbers of people. When projected across a large and dynamic economy such as the United States, making major multi-level transformations rapidly is extremely difficult and may be helped by large volumes of communications and support. Said AKM dashboards for identified users may include multiple modules such as: Dashboard title and/or logo and tagline 7688. Once logged in, identified users see their own stored AKM results data 7689 such as their name (“Jane Smith”), ID (“jane@smith.com”), the comparative scope of their dashboard (such as “Comparing you to top geographies, latest 30 days”).

Navigation to what is reported 7690 7691: Navigation title such as “Your AK Use: See your AKM reports (or dashboard) ”. Navigation widget 7690 such as a “tree,” “menu,” “list,” etc. Navigation highlighting or identification of what is selected 7691 in said navigation such as a QOL goal like “Energy use”. Means to scroll or access a longer list if said navigation provides more choices than can be displayed.

Means may be included for dashboard users to provide feedback, ratings and improvement suggestions 7692.

A selection and input zone 7693 permits users to specify the dashboard's settings or parameters without needing to be familiar with which dashboard data selections are required or how to use the dashboard engine's syntax, such as (in this layout) selecting: Selection module title 7693. Multiple filters or selectors 7694 such as to choose a geography (Filter 1 in this layout) and/or choose a time period (Filter 2 in this layout). Capability to add or remove modules 7699. Capability to save said customized new dashboard(s) 7698.

Graphical summary module 7695 which in this figure is "Energy use, 30 days" and also provides drill down access to AK to make additional energy savings improvements; each area is ranked from the largest to the smallest such as: (categories are representative and may be changed to fit users or energy uses). Heating/AC. Auto/gasoline. Kitchen/laundry/water. Lighting/other.

An AK activity and use module 7697: this module provides detailed AKM usage activities such as (in this layout) for your use over the past 30 days: This module shows one way to provide detailed AKM usage data that breaks down AKI and AK deliveries during uses of devices to produce energy savings, with the ability to drill down and examine each AK activity. This modules detailed AKM data includes three areas: Devices life cycles including stages such as pre-purchase finding, buying, initial installation and setup, using, troubleshooting and problem solving, etc. AKI during energy-saving uses of said devices including steps such as the number of AKI requests, how often that delivered AKI was seen, how often that AKI was used successfully, the AKI "bounce rate" (that is, the frequency of receiving but not using said AKI; which is different than the failure rate where AKI was used but did not produce a success), how often next step AKI was requested, etc. AK usage as part of or after AKI/AK deliveries includes two main categories of steps; first is switching to "best choices" with steps such as requesting best choices, looking up best choices information, and ordering a best choice; second is the overall understanding of AK use including steps such as the total number of AK request, the number of times AK was received, how often AK was retrieved from Websites, how often AK was retrieved as download documents, the total number of uses of all AK received, etc. Each row may also have an indicator that shows the number's change from the previous time period, which in this layout is a green arrow head pointing up for a larger number, or a red arrow head pointing down for a smaller number. Each of this modules data rows (in this layout) may be clicked on to drill down and examine that rose data in more detail.

Modules may be goals-based 7098 which in this layout is closed and may be opened by clicking the upward pointing arrow head next to said close module's title. Said goals-based module 7098 lists said user's "Top personal energy goals" and, if displayed, would list said goals in said user's priority order (e.g., with the user's top goal first) with the current success rate displayed next to each goal.

Comparative energy use 7088: This module compares said user's energy use versus three others graphically by means of a line graph in which one variable is total energy used (y axis) is displayed over time (x-axis, the past 30 days), showing said user's energy use verses: That user's ZIP code. That user's city/metropolitan area. That user's country. Said comparative module may also be displayed as a tabular grid by means of module control that enables viewing said module as a list or a graphic (such as module control 7682 in FIG. 224).

Current alerts 7092: This module lists said user's energy alerts that relate to the achievement of said user's energy use QOL goals 7691 such as: The title and subtitle 7092 clarify that the czar that user's alerts, that they are listed by category and cover the actual number of alerts received during the past 30 days. A category selector 7093 clarifies that the alerts displayed are for home electricity use. The actual table of current alerts 7094 may include columns such as a checkbox that shows whether each alert is turned on or off ("on" if checked), the name of each alert, and the number of alerts during the past 30 days. Means to edit said current alerts 7095 is provided for adding/deleting alerts, changing the device(s) to which each alert applies, etc.

One or more advertisements may be displayed in dashboards 7686, and said advertisements may be run by vendors whose device(s) compete directly in any product category displayed in the dashboard, which in this case may be any appliance, automobile, home heating/AC, etc. that uses energy.

AKM comparative reporting: Both AKM reports and AKM dashboards may include comparisons and comparative reporting such as to identify and calculate gaps such as between the best achievement levels and the current metrics for a user(s) who is running a report or dashboard. FIG. 226 provides a flow chart that exemplifies selecting and calculating said comparisons 10001; retrieving stored AK data 10011: and displaying said comparisons on a report or dashboard 10017. Selecting and calculating comparisons 10001 begins by selecting the calculations scope 10002 such as by selecting the user(s), device(s), goal(s), geography(ies), metric(s), time period(s), etc. Based on said selections, obtain and store the first collected data set from AK records 10003. Said stored records include any source of AKM, AK or external AK data sources 10011 including third-party(ies) which may include: User AKM record(s) 10012; AK results (raw data) 10013; AK results (ranked data) 10014; Group(s) AK results (ranked data) 10015; Third-party(ies) or other external AK results data 10016.

If comparing said first collected data set to a second data set 10014, then obtain and store second additional data set(s) from AK records 10011 (which may include any source of AKM or AK data). If comparing said collected data sets to a third or more (multiple) data set(s), then obtain and store said additional data set(s) from AK records 10011 (which may include any source of AKM or AK data). If comparing said collected data sets to a peer or benchmark 10019, then obtain and store said peer or benchmark AK data set(s) from AK records 10011 (which may include any accessible source of AKM or AK data). If the need to include an additional comparison(s) ends at any point such as after the first collected data set 10003 10004, or after the second collected data set 10006 10007, or after the third or more (multiple) collected data set(s) 10007 10008, or after a peer and/or benchmark collected data set(s) 10009 10010, then proceed to calculating and displaying said comparison report or dashboard 10017 10018. After said comparison report or dashboard has been displayed 10018, then review and edit said report(s) or dashboard(s) 10019 which may include using, changing, saving, drill down to additional data, re-running saved reports or dashboards, etc.

AKM reporting for vendors and customers: FIG. 227 illustrates AKM reporting for vendors on individual "devices" (as defined by the AKM). The purpose of said vendor reports and dashboards is a core object of this AKM so that said devices may be improved based on their users, with improvements that benefit customers. These vendor reports may be publicly available so they may also be used by customers to become more informed about devices they use, by prospects for devices they are considering buying, etc. Said report data may also be provided as AKM dashboards, or as comparative reports or dashboards. FIG. 227 provides in some examples AKM reporting on a device 10230 by means of a report that is pre-calculated and retrieved, or by means of on-demand reports that are run and calculated when requested. Said AKM reporting by device(s) may include components such as: Report title 10237 such as "Active Knowledge: Device Success/Failure Report".

Navigation to the device that is reported 10231 10232 10233 10234. Navigation title 10231 such as a device category like "PC Software" or a device name like "Microsoft Vista". Navigation widget 70232 such as a "tree". Navigation highlighting or identification of the device selected 10233 in said navigation such as a product (like "Microsoft Vista"). Means to scroll or access a longer list 10234 is said navigation provides more choices than can be displayed.

Means to access additional AK 10235 that applies to said selected device 10233, some examples of which may include: Run saved reports; Edit/save report(s); Current dashboard(s); Progress dashboard(s); Goals dashboard(s); Edit/save dashboard(s); Etc.

One or more advertisements may be displayed in reports 10236 10238 and said advertisements may be run by vendors whose device(s) compete directly with said selected device(s) 10233 10240 whose AK vendor report is displayed 10230.

Tabs 10239 or another similar navigation widget may provide top center high-level navigation for categories that display the device name that (in some report examples) is listed and highlighted in the left navigation 10233, and the same device name which is listed in the top center report title 10240. In some examples each tab is a separate metric 10239 and since there are more tabs than can be displayed said tabs may be scrolled left and right 10243 to make additional tabs visible or hidden; in some examples this report's center content is on the second metric which is "Satisfaction," and that metric name would be used as the tab label instead of "Metric 2" (e.g., "Satisfaction").

The report title may be placed at the top center of the body of the report 10240 and may display the name of the selected device such as "Windows Vista".

A selection and input zone 10241 permits users to specify the report's settings or parameters without needing to be familiar with which report data selections are required or how to use the report engine's syntax, such as (in some examples) selecting: Said selection and input zone 10241 may employ various formats, functions and designs which in some examples parallels a checkbox list with pulldown selectors that provides for selecting one row (such as geography) and one level within said row (such as country). Geography: Multiple areas may be listed, and in this case the user's country is selected. Products: In some examples products are selected by brand and model in the left navigation; in this zone comparisons are selected with products of varying levels of performance such as the best-performing products, average products, and the worst performing products; and in this case no selection is made. Users: in some examples comparisons are selected with users of varying levels of performance such as the most successful users, average users, or the least successful users; and in this case no selection is made. Time: Because this report is generally intended to be run by identified vendors whose device performance is tracked and stored over time, data is available for constructing reports that show that they're reading time periods, which in some examples include today, this week, this month, this year, or this year versus last year.

Center content area 10240 10241 10242 10244 10245 10246 10247 10248 10249 10250 10251 10252: Any type of reporting or dashboard content and/or calculation(s) may be included; if additional data is available but not displayed, means may be provided to make said additional data visible such as (in some examples) a scrollbar on the right 10246.

First center content area (whether for a report or dashboard) may be provided by employing any reporting and dashboard means such as: Sub-title 10244: Said sub-title may specify the name of the metric (in some examples "Metric 2: Satisfaction", "Satisfaction", etc.) and list the selectors from the selection and input zone 10241, namely the geography (in some examples "country—USA", etc.) and time (in some examples "year-to-date", etc.). Pie chart 10247: Any type of graphical display of data may be used, in some examples a color-coded pie chart that lists the numeric percentage of each slice in the chart. Data table 10245: Any type of tabular grid display may be used, in some examples a color-coded list whose colors match the accompanying pie chart and whose order may be sorted both up and down such as by means of multiple clicks on a column label(s).

Second center content area (whether for a report or dashboard) may be provided by employing any reporting and dashboard means such as: Sub-title 10248: Said sub-title may specify which data (such as the users' issues) that drive the data in the first metric's area (Dissatisfaction issues, with the device name [optionally] listed so it is clear that said issues are associated with said device) listed in order (such as with the lowest satisfaction first). Data table 10249 10250: Any type of tabular grid display may be used, in some examples a sorted table whose order may be sorted both up and down such as by means of multiple clicks on a column label(s). Drill down to comparative data 10251: Means may be provided so that each type of data may be compared, such as (in some examples) with the best same-category device formetrics such as satisfaction. Scroll bar to see additional data 10249 10250: When additional data is available but not displayed, means may be provided to make said additional data visible such as (in some examples) a scrollbar on the right.

A third or more center content areas (whether for a report or dashboard) may be provided by employing any reporting and dashboard means; in some examples reported information 10252 may include direct data reporting and/or indirectly calculated measures from said direct data such as efficiency (which may be calculated by known and/or standard in efficiency measures, and may include reporting by the area's graphical or tabular means, along with showing data over time which may indicate whether efficiency increases, decreases or remains about the same as a result of use).

AKM content—summary of AKM content creation: As the speed of technology advancement increases to near real-time, and the scale of applying new technology, products and services expands to global levels, this provides means for continuous improvement in the "Best Active Knowledge" delivered to users, vendors and others as a normal part of their everyday activities as they adopt and attempt to apply these new and unfamiliar capabilities. Means are provided for users, vendors and others to create and/or edit AKI and AK, with those additions, creations and/or edits tested, validated and optimized as an AKM process so that the rate of success might actually deliver what is needed and/or hoped for from said continuous advances in new capabilities.

Turning now to FIG. 228, "AKM Optimization Services," a high-level description is provided of an AKM process for users, vendors and others to (optionally) create or edit AK and AKI (including interfaces, metadata such as devices or tasks or steps, templates, instructions, etc.); with those additions, creations and/or edits tested, validated and optimized to assure high-quality AK and AKI. Said process begins when a device and/or task have been selected 7700 such as automatically during used of AKI on a device, by manual selection such as with an AID/AOD, etc. After said selection a range of additions, creations or edits may be selected and performed such as: Enter/edit hierarchy 7701: If selected, the current IA can be edited, created or added 7702. Enter/edit device list 7703: If selected, the current existing device list(s) for that IA can be edited, created or added 7704. Enter/edit device configuration 7705: If selected, the current configuration for that device can be edited, created or added 7706. Enter/edit task list 7707: If selected, the current task list(s) for a device category, a vendor's device, or an individual model of a device can be edited, created or added 7708. Enter/edit list of steps 7709: If selected, the current steps list(s) for a task(s) can be edited, created or added 7710. Enter/edit instruction(s) 7711: If selected, the current instruction(s) for a step and/or set of steps can be edited, created or added 7712. Enter/edit other 7713: If selected, other areas may be edited, created or added 7714 such as templates, boilerplate, interfaces, layouts, widgets, and/or any other AK or AKI content.

After any edits, additions and/or creations are performed 7702 7704 7706 7708 7710 7712 7714 (collectively referred to herein as "edits"), said edits are tested in a "sandbox" 7720 to provide dynamic determination and validation of the best AK and AKI by means of real AK uses. Said testing sandbox 7720 may include multiple types of tests such as in some examples template tests 7721, multivariate testing 7723, instructions tests 7725, and/or other types of tests 7725 such as A/B tests, layout tests, usability tests, etc. If any of those tests is employed and produces optimized AK or AKI 7722 7724 7726 then the "Best AK" or "Best AKI" for delivery has been determined, and may be delivered 7718. Simultaneously, the best "sandbox" testing and optimization methods are determined automatically 7728 7729, and those better testing methods may be utilized for the tests conducted to optimize AK or AKI 7720 7721 7723 7725. Also simultaneously, the results of said edits may be logged and/or stored 7715.

"Sandbox" for AKM optimizations: FIG. 229 illustrates the AKM optimization services process by means of testing processes that optimize and validate edits such as described in FIG. 228 and elsewhere. Said FIG. 229 "AKM Optimization Sandbox" includes: Dynamic and/or periodic determination of users that may be included in testing 7732, or are automatically excluded from testing 7736: In some examples it is known whether each AK/AKI user is identified 7733, a subscriber 7733, a free and/or anonymous user 7733, a paid user 7733, etc. If anonymous 7735 and/or free 7735 users: Said users may be included in or excluded from tests based upon rules (such as frequency of inclusion, types of users, etc.), and/or needs for users to include in testing. Excluded users 7736 receive "best-known" and AK and AKI 7737, while included users 7738 are dynamically selected (as their requests are received for AK/AKI) to participate in tests to determine the "best AK and AKI" 7744. If identified users 7734 (such as subscribers, members, those who paid to receive a plurality of types of AK and/or AKI, etc.): Said users may be included in or excluded from tests based upon rules (such as said users' selection of opt-in/opt-out status, entitlement to receive nothing but "best-known AK/AKI", etc. Excluded users 7736 receive "best-known" and AK and AKI 7737, while included users 7738 are dynamically selected to participate in tests to determine the "best AK and AKI" 7744.

Determination of AK and/or AKI content to test 7740: Said content edits were described at a summary level in FIG. 228 as well as elsewhere, and may be (optionally) made by users, vendors or other sources 7741 at their discretion. Said edits 7742 may optionally be reviewed to determine that they have not been suggested, tested and rejected previously 7743. Said determination may be automated such as by machine recognition 7743, or manual 7743. If previously rejected they may be rejected again 7743 by means of one or more rule(s) such as "if tested and rejected within the previous 12 months, then terminate without retesting." In addition, other edits may be suggested during the test process 7744 7751 and these are also included with new edits 7742. These new edits from testers 7751 may also (and optionally) be reviewed 7743 before including them in testing 7744. Said content edits 7742 that are determined as appropriate for testing 7740 are included in testing 7744.

At this point both the users that may be dynamically selected to participate in testing 7732 and the content to test 7740 have been determined. Multiple types of tests may be run 7745 7746 7747 7748 7749 such as template tests, multivariate tests, instructions tests, comparison tests, new concept tests, other types of tests, etc. An optimization process 7752 compares the results of each item tested against known AK/AKI performance by means of a variety of optimization criteria, metrics and/or rules to determine the best means for optimizing AK/AKI. In some examples means are used to illustrate said optimization(s) 7753, and each type of optimization 7754 7755 7756 may be selected independently for each type of test 7745 7746 7747 7748 7749 including: One winner 7754: The one that tests best moves on, and the others are terminated. Better 7755: Those that are best move up and are used more often (with the increase determined by means such as proportionate to their relative or absolute amount of improvement); those with average performance are used with lower frequency; while those with the lowest performance are terminated. Other 7756: Other types of optimizations may be used, whether currently known or newly invented.

Also included is an optimizations methods improvement process 7758 that determines improvements in test types 7744, improvements in optimization methods 7752, etc. Said optimizations improvements 7758 include logging each optimization and test method 7759 and storing the associated metrics such as results 7759, speed 7759, cost 7759, reliability 7759, AK EVA (the Economic Value Added of AK, as defined elsewhere such as in FIG. 242) 7759, etc. Those test types 7744 and optimization methods 7752 that are in the top tier of logged metrics 7759 7760 7761 are utilized often or always. Test types 7744 and optimization methods 7752 that are in the middle metrics 7759 7760 7762 are utilized some or occasionally, while improvements in said average performing tests and/or optimization methods are considered and tested to determine if they may be raised to become top-tier processes. Those test types 7744 and optimization methods 7752 that are in the low tier of logged metrics 7759 7760 7763 have their use terminated.

AKM optimizations resources, ratings and feedback: FIG. 230 and FIG. 231 illustrate AKM means to obtain data for testing 7744 and optimizations 7752 processes, as well as for improving said processes 7758. Turning now to FIG. 230 "AKM Optimizations and Testing Data Resources," AK Resources (Active Knowledge Resources) 7769 include data received from AKM processes 7766 which may be characterized as one or more "funnels" 7767 7768 that may yield higher levels of success and satisfaction; with said data retrievable from AK resources databases 7770. AKM, AK and AKI data whose collection can be automated 7767 may include any, some or all of: Categorized device, task, goal(s) and/or usage patterns (statistics); Percent AK in use/Percent AK turned off; Percent of uses that produce AK requests; Percent of AK requests where AK is received successfully/ Percent of AK requests with communications issues; Categorized AK requests (ranked by percentages, numbers, etc.; often listed in frequency order with most frequent first) by issues, devices, user types, etc. AK sent (percent of AK requests received); AK used (percent of AK received by issues, devices, user types, etc.; ranked by percentages, numbers, etc.; often listed in frequency order with most frequent first); Percent AK bounce rate (AK closed without being used by issues, devices, user types, etc.; ranked by percentages, numbers, etc.; often listed in frequency order with most frequent first); Of the AK used, percent succeeded/percent failed (in each category); Percent of AK requests received that led to a request for additional AKI (such as AK next step(s)); Percent of AK requests received that led to a request for other AK (and if tracked, the rate of use of said other AK requested); Percent of AK requests received that responded to a delivered advertisement(s) and/or marketing information; Percent of advertising responses and/or marketing information responses that request additional information and/or make a purchase (at that time or later); Percent of AK requests received that request "best choice(s)" information; Percent of requests for "best choice(s)" information that produce a conversion to a "best choice" (at that time or later);

AKM, AK and AKI data whose collection may require at least some manual entry 7768 may include any, some or all of: User ratings of AKI (Active Knowledge Instructions); User ratings of AK (related Active Knowledge); User ratings are of "other AK" (items included with AKI/AK deliveries) and/or advertisements/marketing information; Percent that edit, create and/or add AKI/AK (users' edits, feedback, suggestions, additions of new AKI/AK, etc.); Percent that edit and/or create device instructions ("Direct AKI" for tasks); Other manual entries, feedback, suggestions or additions to AKI/AK;

Said automated data collection 7767 and/or manually entered data 7768 are stored as Active Knowledge Resources 7769 in AK resources databases 7770. Turning now to FIG. 231 "AKM Optimizations Manual Rating and/or Feedback System(s)," AKM processes are illustrated for obtaining manual ratings and feedback (herein termed "qualitative data"), and for associating said qualitative data with appropriate quantitative optimizations data. In said AKM manual rating and/or feedback system, AKI/AK are received by a user 7772 and user's device or AID/AOD shows a link, flag, icon, text label or other indicator that a rating and/or feedback is needed or helpful 7773. Since said rating and/or feedback are optional, some users may choose to provide that 7774 and these participating users are termed "raters" herein. This creates a ratings event with an ID(s), date, and data for session, device, task, step, user (if identified), etc. 7775.

Said rater's rating(s) and/or feedback may be downloaded and done locally 7776 by delivering a form, survey, or other type of interaction that is presented to said rater 7777 by means of rater's device and/or AID/AOD, and continued until completed 7778, and when completed both ID's and data are transmitted to appropriate server(s) 7779 which may be AKM servers or by means of a rating and/or feedback system provided by a third-party. Depending on the capabilities of each device that presents questions for either/both quantitative ratings and/or qualitative feedback and/or suggestions, multimedia input may be provided by raters such as pictures, video, audio recordings, etc.

Said rater's rating(s) and/or feedback may be done online 7780 by providing a link or other means to an online display of a form, survey, or other type of interaction that is presented to said rater 7781, and said ratings of event continues until completed 7782, and when completed both ID's and data are transmitted to appropriate server(s) 7783 which may be AKM servers or by means of a rating and/or feedback system provided by a third-party. Depending on the capabilities of each device that presents questions for either/both quantitative ratings and/or qualitative feedback and/or suggestions, multimedia input may be provided by raters such as pictures, video, audio recordings, etc.

At said receiving server(s) 7779 7783 ratings data is stored from ratings events 7775 and ratings processes 7776 7780 then periodically analyzed 7785, such as for each item rated sorting the raw quantitative ratings in descending order 7785 and dividing them into categories and/or groups 7785 such as quintiles, high/average/low, etc. Said analysis process(es) may utilize any known means for analyzing surveys, quanitatitve questions, qualitative feedback, text (suggestions) content analyses, etc. and continue 7786 until all appropriate data has been analyzed 7785 7786 by any combination of analyses methods that is appropriate. At intervals such as during said analyses or upon their completion, analyzed and scored data 7785 (such as stored raw data, a processed category of data, or part or all of a saved report) is written to an appropriate database(s) 7787 such as AK Resources 7794 or third-parties 7795 that may provide any type of rating, feedback, suggestion, etc. service(s) or system(s).

Both quantitative and qualitative data may be associated with each other such that for an item (in some examples a single device's task, step and AKI instruction) both the quantitative rating(s) and qualitative feedback and suggestions may be associated with each other both for analysis, storage, and retrieval (such as reporting in a report and/or dashboard; or for use by a system such as for automatically determining the outcome of a test 7744 in FIG. 229 and/or an optimization 7752 in FIG. 229). Said data association process 7786 is performed item by item 7790: For each item rated, first gather its qualitative data and associate each data item with at least one quantitative rating(s) 7790. Then organize said associated data into stored raw data, stored processed category of data, or component of a saved report(s) by means of said associated ratings 7791. Then write said associated and organized data, and/or saved report(s) to appropriate database(s) 7792 7793 7794 (retrievable as and from databases such as AK Resources 7794 or from third-parties 7795).

AKM content creation or editing processes, media and tools: To edit existing AKI or AK, to create new AK or AKI, to edit or provide new templates or layouts or interfaces, users or vendors or others may utilize a plurality of starting points, methods and tools to edit the content or format of said AKI and AK, or create new or improved versions. Said edits and/or creations may be performed using a range of devices, tools, or AIDs/AODs. A plurality of these can be performed with known processes and tools for editing and/or creating content in a plurality of forms and formats such as text, multimedia, etc. However, some option are summarized in FIG. 228, namely dynamic methods for editing or creating AKI/AK during or following the use of said AKI/AK, so that actual use by a plurality of real users may continuously improve the quality of these resources. FIG. 232 illustrates this in more detail, while FIGS. 233 and 234 provide methods and tools for said processes.

Turning now to FIG. 232 said dynamic editing/creation process begins when an AK trigger is sent from a device 10040 and/or an AK request is sent by means of an AID/AOD 10041. Said trigger or request is received 10042, and the appropriate AKI/AK is retrieved 10042 10043, which may include either "Best AKI/AK" 10044 or AK/AKI that is to be tested from the testing "sandbox" 10045 (as described in FIGS. 228 and 229). Said retrieved AKI/AK is delivered and displayed 10046 on said requesting device 10040 or requesting AID/AOD 10041, which content may be displayed in formats 10047 such as text 10048, video 10049, audio 10050, and/or other types of content or media 10051. Said displayed AKI/AK is used 10052, or recipient chooses to skip use and (optionally) edit or create AKI/AK 10052. Whether used 10052 or usage is skipped 10052, recipient may (optionally) choose to edit said retrieved and delivered AKI/AK 10053, or create new AKI/AK 10053 by means such as described in FIG. 228, which would employ methods 10054 such as a tool(s) in the device 10055, a tool(s) that is run from or downloaded to a device 10057, a tool(s) in an AID/AOD 10056, a tool(s) that is run from or downloaded to an AID/AOD 10058, etc. New edits or new creations are published to the testing "sandbox" 10059 and 7740 in FIG. 229 where they are tested 7744 and optimized 7752 to produce "Best AKI/AK" 10062 for storage to AK Resources 10044 10063 10064 10065, including improvement processes to improve boasts both testing methods 10061 and optimization methods 10061.

FIG. 233 illustrates AKM methods for editing or creating AKI/AK, which again begins with an (optional) dynamic method for editing or creating AKI/AK during or following the use of said AKI/AK when said user selects the option(s) of editing, adding or creating AKI/AK 10070, and 7701 7703 7705 7707 7709 7711 7713 in FIG. 228. The choice of editing AK/AKI may employ methods such as a tool(s) in the device 10071 or in an AID/AOD 10071, a tool(s) that is run from a device 10072 or run from an AID/AOD 10072, a tool(s) that is downloaded to a device 10073 or downloaded to an AID/AOD 10073, etc. In any of those editing processes 10074 an edit event is created 10075 with an ID(s) and data such as for a session, device, task, step, user (if identified), etc. The edit(s) is performed using a tool(s) in a device 10076 or in an AID/AOD 10076, or by means of a tool(s) run from or downloaded to a device 10077 or run from or downloaded to an AID/AOD 10077; with said edits including components such as the AKI's/AK's metadata 10078 (such as its category, device, task, navigation IA, etc.): its content 10079 (such as text, video, etc.); or any other edited components 10080. When completed, an edit(s) is uploaded to AK Resources 10082 (with or without IDs and an edit log), where it is received and stored in the test "sandbox" portion of AK Resources storage 10083.

The choice of creating AK/AKI may employ methods such as a tool(s) in the device 10084 or in an AID/AOD 10084, a tool(s) that is run from a device 10085 or run from an AID/AOD 10085, a tool(s) that is downloaded to a device 10086 or downloaded to an AID/AOD 10086, etc. In any of those creation or addition processes 10074 a creation event is created 10088 with an ID(s) and data such as for a session, device, task, step, user (if identified), etc. The creation(s) is performed using a tool(s) in a device 10089 or in an AID/AOD 10089, or by means of a tool(s) run from or downloaded to a device 10090 or run from or downloaded to an AID/AOD 10090; with said creation(s) including components such as the AKI's/AK's metadata 10091 (such as its category, device, task, navigation IA, etc.): its content 10092 (such as text, video, etc.); or any other created components 10093. When completed a creation(s) is uploaded to AK Resources 10082 (with or without IDs and an edit log), where it is received and stored in the test "sandbox" portion of AK Resources storage 10083. If said (optional) AKM methods for editing or creating AKI/AK are not used 10071 10072 10073 10084 10085 10086 then said user accepts the current AKI/AK and said editing/addition/creation process is not invoked and ends 10097.

Turning now to FIG. 234, media and tools for AKI/AK content editing or creation are illustrated. In a first instance a user or vendor chooses to create or edit AKI/AK using a tool(s) in a device 10100, or downloaded to a device 10100. By means of said tool(s), said user or vendor may edit AKI/AK during or after use 10101, or alternatively create AKI/AK separately from use 10102. In either case, whether editing in 10101 or creating 10102, said updated or new AKI/AK 10104 is uploaded to AK Resources for "sandbox" testing 10105 10106. In a second instance a user or vendor chooses to create or edit AKI/AK using a tool(s) in an AID/AOD 10108, or a separate tool(s) that are run from an AID/AOD 10108, or a tool(s) that is downloaded to a device 10108. Said tools may include or be part of 10109: Web-based applications or forms; Downloadable applications or interactive tools; Text, video and/or audio editors; Portals, portlets, widgets; Collaborative AK/AKI (creation, design; development); Creation services (vendors, freelancers, AK sources, etc.); Video sharing, photo sharing, media sharing, cataloging; eLearning, tutorials, open source how-two; Wikis; Blogs; Micro-blogging (e.g. Twitter, et al); Lists, clipping (link lists, tools, cut and paste tools); Social networks (some with their own tools or applications); Social bookmarking/cataloging/citations; Social action; Social search; Internet search, real-time search; Shopping resources; Advertising networks; Usage tracking and/or payment services; Instant messaging, IRC (Internet Relay Chat); Internet forums; Entertainments; Massive multiplayer online games; Question and answer services; News (open-source reporting, citizen journalism, news organizations, etc.); Personals; Entertainment; Other tools or resources, etc.

In some examples by means of said tools and AIDs/AODs, AK resources that may be created or edited may include 10111: User created or edited AKI or AK; Freelancer-provided AKI or AK; Third-party created or provided AKI or AK; Links to online tutorials and how-two; Alerts (such as IM or Twitter) for instant help; Advertisements to buy competing products, services, and/or devices; Advertisements to buy "best choice" alternatives; Shopping links to buy those products, services, devices, "best choices", etc.; Usage tracking for payment for ad views, purchases, usage, etc.; Links to join others who help in this area (to social action, social network, blogs, forum, entertainments, etc.); Personals to advertise the AK creator; Etc.

Regardless of the AID/AOD employed 10108, the tool(s) used 10109 or the type(s) of AK resource(s) edited or created 10111, said updated or new AKI/AK 10110 is uploaded to AK Resources for "sandbox" testing 10104 10105 10106.

AKM content API's to access global AKI or AK: Where relevant and appropriate knowledge content is stored outside the AKM, and it is accessible by standard or custom APIs (Application Programming Interfaces), said knowledge content may be accessed, retrieved and delivered by the AKM by means of said API's. Said access and retrieval begins by receiving an AKI/AK request 10114. If it is an AK request for AKI/AK that is native to the AKM 10115, then it may be retrieved directly from AK Resources 10118 10119. If, however it is an AK request for AKI/AK that is an external to the AKM 10120 (such as from third-party content or knowledge resources) then it may be retrieved from a third-party storage 10132 or source 10132 by utilizing a service (such as a Web service or an S08 service), an API, etc. 10121. If a Web or SOA service it may be a REST stateless request 10123 or another fully defined service or operation 10125; if a standard or known content API 10124 10127 it may be one such as:

Java content API 10128 (JCR [Java Content Repository], JSR-170, JSR-283, Apache Jackrabbit, etc.); IBM WebSphere content API 10129 (libraries, document model, etc.); Other standard content API's 10130; Custom content API's 10131.

As said external knowledge content 10122 10132 is made accessible it may (optionally) be included in the AKM testing "sandbox" 10133 to test, validate and optimize said external content prior to using it in any substantial volume of AKI/AK retrievals and deliveries. However, if an AKI/AK request is received 10114 and it is not a native AKM request 10115, nor is it a request for AKI/AK that is an external to the AKM 10120, then identify the error, log it, report it for fixing 10121 as described in FIG. 237, then wait for another AKI/AK request 10121 10114. Similarly, if a request to is received for AKI/AK that is an external to the AKM 10120 but it is not a REST stateless request 10123 or another fully defined service or operation 10125 or a standard or known content API 10124 10127, then identify the error, log it, reported for fixing 10126 as described in FIG. 237.

AKM API's for "direct" AKI" to automate task success: During the use of a device(s) users may receive AKI that offers the option of having the AKI directly control the device (s) and performing the Active Knowledge Instructions on behalf of the user (herein called "Direct AKI"). Where a Device(s) in Use (DIU) may be directly controlled by means of instructions that are delivered from an external resource (that is by Direct AKI), and the means for said direct control is by standard or custom API's, then said means for creating and/or editing said Direct AKI may be provided, for storage in the AKM's AK Resources or by a third-party, and delivery by the AKM. Said editing or creation of Direct AKI Instructions begins by waiting for a request 10134, which is by means parallel to waiting for other AKM requests. When said request 10134 is received, lists of available devices that may have Direct AKI Instructions is retrieved 10135. Based on said Device in Use (DIU), one or more devices is selected 10136, or one or more lists of devices is opened 10136. If said DIU is not available either individually or on a list 10137 then said request 10134 is terminated 10138. If, however, said DIU is available either individually or on a list 10137, then the appropriate DIU device(s) data is retrieved 10139 (herein called in "DIU device item") including the data required to edit or create Direct AKI for said device 10139. Within said DIU device item, walkthrough all of said DIU device data 10140, or go to one or a plurality of Device AKI Instruction(s) based on matching criteria 10140 for the purpose of discovering or explicitly managing the item fields 10141 or instruction fields 10141. Said walkthrough of each field 10141 or instruction 10141 is to discover or explicitly access said field(s) label, data type, attribute, value(s), parameter(s), etc. and display accessible choices for edits 10142 by means of any known type of editing or authoring software, form, or program 10142. By means of said discovery, display and editing Direct AKI Instructions functions are edited or written 10143. Said editing or authoring software, form or program 10142 may (optionally) utilize a standard set of functional categories and/or labels for consistency across a plurality of DIU's such as: Meta-data (author, source, version, tag/keyword, etc.); Lookup function (name/ID, etc.); Function (control, etc.); Action (value, start, advance, stop/end/quit, etc.); Connect (open, receive, send, close/quit, etc.); Undo (reverse, confirm, etc.); Local (get, save/store, etc.); Setting (attribute, parameter, etc.); Record/store (local, remote, etc.); Edit/update/create (read, modify, write/add, upload, delete/remove, etc.) field label, data type, attribute(s), parameter(s), value(s), etc.; Etc.

If said standard set of functional categories and/or labels 10143 cannot be employed 10144 because there is no functional match 10145, then present the actual DIU's API fields 10145 for editing or authoring, and when that is completed stores said Direct AKI instructions in the appropriate database(s) 10152. If, however, said standard set of functional categories and/or labels 10143 can be employed 10144 because there is a functional match with the actual DIU's API(s), then provide consistent means to view and edit said DIU's API(s) 10143 by means of consistent categories, labels and functions. In either case 10144, whether said standard set of functional categories and/or labels 10143 can or cannot be applied 10144, said DIU employs the appropriate API as previously retrieved, walked through and discovered 10139 10140 10141 10142, which may include APIs 10146 such as: ACPI (Advanced Configuration and Power Interface) standard 10147; Device API's standard (W3C working group) 10148; Mobile Device API's Initiative (part of Open Ajax Alliance) 10149; Other standard device control API's 10150; Custom device control API's 10151.

As said Direct AKI is edited or created 10142 and stored for AKM delivery 10152 it may (optionally) be included in the AKM testing "sandbox" 10153 10154 to test, validate and optimize said Direct AKI Instructions prior to using it in any substantial volume of AKI/AK retrievals and deliveries. If validated it may be committed and used 10154. If, however, said DIU API 10146 10147 10148 10149 10150 10151 is read-only and may not be edited to create Direct AKI Instructions 10155, then it is possible that it must be adopted and implemented "as is" without testing or validation 10153 10154. After completion of said editing or writing Direct AKI Instructions, said lists, Device AKI Instructions items, etc. are closed 10156 and the Direct AKI editing or creation process ended.

AKM ERROR MANAGEMENT: FIG. 237 illustrates AKM error management and correction including both automated, manual and user-involved processes. Said error management and correction begins by waiting for an error trigger or error message 10160 as described elsewhere, which may include: Recognition/lookup error 10161; Storage error 10162; Trigger, navigation, IA, hierarchy, etc. error 10163; Content error 10164; Other type(s) of error(s) 10165 such as a metadata error, API error, API content error, duplicated content error, content editing needed, other error type, etc.

When said error trigger or error message is received 10160 10161 10162 10163 10164 10165 initiate error correction 10166 by creating the appropriate type of error event 10167 with error ID 10167. If said error can be fixed automatically 10168 by any automated means of error recognition and correction 10169, then perform said automated correction 10169, then validate said correction automatically if needed 10169, or validate manually if manual review is needed 10171. If said error cannot be fixed automatically 10168 and requires manual correction 10170, then perform said manual correction 10170 and validate said correction 10171 if needed. If customers might help fix or prevent said error(s) 10172 then (optionally) determine that 10173 and set up and take appropriate action(s) such as: Send alert(s), message(s), etc. 10174; Send AKI instructions 10175; Send AK corrective actions 10176; Perform, make or send other corrections 10177.

If said appropriate user-involved action(s) fixes or prevents said error 10178 then validate said correction 10179 if needed, followed by notifying customer of said fix or prevention 10180 and wait for a different error trigger or error message 10160. However, if customers cannot help prevent or fix an error(s) and are not involved 10173, or if after involving customers 10174 10175 10176 10177 said error(s) are not fixed or prevented 10178, then (optionally) notify customer 10180 and wait for a new and similar error trigger or error message 10160 to begin another attempt at error correction.

AKM global optimization(s) and ecosystem(s): Part of an AKM is for it to be able to identify, track, optimize, improve, etc. performance in areas such as: Issues and/or problems: Determine performance problems with the largest impact or costs and prioritize them (such as the largest issue first). Gaps: Determine the largest gaps in performance between the best and worst performers and prioritize them (such as the largest gap first). Opportunities for improvement: Determine the greatest potential gains or "leaps ahead" in performance and prioritize them (such as the largest potential gain or opportunity first).

AKM optimization services ecosystem: FIG. 238 "AKM Optimization Services Ecosystem," provides a high-level summary of an AKM optimization ecosystem that includes data acquisition (FIG. 239), conducting optimizations (FIGS. 240 and 241), and predictive analytics/gap analysis (FIG. 242). This process starts in FIG. 238 with data acquisition that includes acquiring data by means of data acquisition services 7808 from sources such as: Vendors 7800 including devices, products, services, etc.; Users 7801 including anonymous users, free members, paid subscribers, etc.; Alerts 7802 including devices, severity, frequency, types, etc.; Events 7803 including devices, severity, frequency, types, etc.; Reporting and/or dashboards 7804 including devices, metrics, issues, gaps, etc.; Other third-parties' data supplied and accessed, etc. 7805; Other AK and AKI data, etc. 7806.

The goal of said data acquisition 7808 is to compile one or more AK optimization priorities lists 7808 (as further described in FIG. 239). Said global optimization priorities lists are used to perform AK optimizations 7809 (as further described in FIGS. 240 and 241) where performance is below a predetermined target or threshold level, which causes an escalation and optimization process to occur, provides varying levels of notification to vendors and third parties, and provides varying levels of additional testing and/or assistance to users. Said optimizations are performed as measured improvement efforts 7810 (as further described in FIGS. 240 and 241), wherein each improvement effort is measured to determine whether or not it has achieved a desired level of performance 7811, and/or a desired amount of improvement 7811. If said desired level and/or improvement are not achieved 7812, then said optimization continues 7809 7810 7811. If, however said desired level and/or improvement are achieved 7812, then said optimization is removed from the active optimizations 7823.

Simultaneously, optimization methods improvements 7818 may be performed by means of logging the optimization method(s) employed 7819 and/or storing the associated data for each method (such as the number of times used, results such as a percentage improvement, etc.) 7819; then ranking the optimization method(s) 7819 7820 so that it can be determined which are among the best methods 7820 so that they may be employed either continuously or more frequently 7810 to perform said optimizations 7810; and so that it can be determined which are among the low (or lowest) optimization method(s) 7820, so that those methods may be used less frequently 7821 (such as by discontinuing if ineffective, or reducing frequency if partly effective), or so that those methods may be improved 7822 or replaced with new methods 7822 and then tested (to determine their efficacy) by means of employing them in measured improvement efforts 7810.

Simultaneously, predictive analytics 7814 and FIG. 242 may determine the impact of raising performance by means of delivering AKI and/or AK. Said predictive analytics may include calculating baselines and comparisons 7815 that may include both gaps (e.g., costs, value lost, etc.) 7815 and opportunities (e.g., AK EVA—Economic Value Added). Said calculated baselines and comparisons 7815 may be reported such as by means of AK global optimization dashboards 7816 and/or reports 7816. As optimizations are conducted 7809 7810 7811 7812 the results data from said optimizations 7817 is utilized to recalculate said baselines 7815, dashboards 7816 and/or reports 7816.

AKM optimizations data acquisition: FIG. 239 illustrates AKM optimization and data acquisition whose goal is to acquire the appropriate data needed to conduct AK optimizations and improvements 7824, which may be conducted by an AKM or by third parties. Various metrics and target levels may be used to acquire the appropriate types of data such as one or more of: Numbers of best and/or worst 7826: Set the number 7827 such as the "Bottom 10" then the "Top 10" for that group. Percentage(s) of best and/or worst 7828: Set the percentage 7829 such as the "Bottom 15%" then the "Top 15%" for that group. Metric(s) 7830 that may include a threshold(s) to determine the best and/or worst 7830: Set a metric(s) and threshold(s) 7831 such as for Satisfaction the "Lowest #" (in some examples 100) then the "Highest #" (in some examples 100) for that group. Other predetermined criteria 7832: Set criteria 7833 such as for a metric (such as the rate of user success/failure) choose the "Lowest # or %" then the "Best # or %" for that group.

In some examples other means may be used for these analyses 7825, such as the quartile/recommend the "best" means described in FIGS. 110 and 111 7825, as well as in some examples other analyses means described elsewhere. For each of these 7827 7829 7831 7833 the appropriate data is gathered from available sources 7834 7844 such as: AK results (raw data) 7835; AK results (ranked data) 7837; User AKM record(s) that include users' performance data 7836; Group(s) AK results (raw data and/or ranked data where it has been calculated) 7838; Devices' and vendors' data 7839; Other AKM and/or third-party data 7840; AKM predictive analytics 7844 (see FIG. 242).

These employ a "fix the worst" process by means of identifying the worst performers by a variety of means, then for each of those groups identifying the best performers so that those may be tested as a model to construct new AKI and/or AK for delivery to the worst performers, to determine if that raises their performance and (optionally) by how much. Alternatively, other processes may be used such as a "copy the best" process by means of identifying the best performers by a parallel range of means to those described above such as numbers 7826 7827 (such as the "Best 10" as a high-performance group), percentages 7828 7829 (such as the "Best 5%" as a group), metrics and thresholds 7830 7831 (such as for Satisfaction, the "Highest 100"), and/or other predetermined criteria 7832 7833 (such as for a metric [such as the rate of user success/failure] the "Best # or %" as a group). If said alternative process(es) are employed then appropriate data is gathered from available sources 7834 7844 such as AK results (raw data) 7835, AK results (ranked data) 7837, user AKM record(s) 7836, group(s) AK results (raw data and/or ranked data) 7838, devices' and vendors' data 7839, Other AKM and/or third-party data 7840, and/or AKM predictive analytics 7844.

Which ever process is used to determine the appropriate data to acquire for optimizations (such as "worst", "best", and/or another process 7826 7828 7830 7832, and which ever data is then acquired 7834 7835 7836 7837 7838 7839 7840 7844, then store the data such as: Store the "worst" 7841

(which identifies the lowest levels of performance, satisfaction, etc.) and then store the "best" for each worst group 7841. Store the "best" 7842 (which identifies the highest levels of performance, satisfaction, etc.). Store any other acquired appropriate data to conduct optimizations such as that stored for "worst" or "best" processes.

Utilize said stored data to calculate and compile a AK global optimization priorities list(s) 7843 and provide that to conduct optimizations and improvements efforts (7809 7810 7811 in FIG. 238, and FIGS. 240 and 241).

AKM optimizations resources confirmation and acquisition: FIG. 240 illustrates the process for confirming that the AKM resources needed to conduct optimizations are available, or if not available, it requests them so that optimizations may be performed.

Said AKM optimization resources process begins with an AK global optimization priorities list 7843 in FIG. 239 and the appropriate stored data 7841 7842 from AKM, third parties and other sources 7834 7844. An item is selected 7846 based on said list and said stored data, and for that item the components (devices, tasks, steps, vendors, AK/AKI, reports, etc.) to improve is derived 7847 by means of walking through each item and selecting/listing which of those are included in said selected item 7848. For each of those selected items and/or components, determine the availability of AK/AKI resources to test to achieve improvements 7849. If adequate AK/AKI resources are available 7849, then move on to conducting optimizations (as described below). If adequate AK/AKI resources are not available 7849, then conduct AK/AKI resource(s) request(s) 7850 for a resource needed by notifying the appropriate source(s) such as: Vendors and third parties 7851; Successful users 7852 of those devices 7847, tasks or steps 7847, processes 7847, etc.; When the appropriate, unsuccessful users 7853 of those devices 7847, tasks or steps 7847, processes 7847, etc.; Others who can provide relevant AK/AKI, etc.

When received from said requests to appropriate sources 7851 7852 7853 7854, then update each relevant AK/AKI resource 7855 7856 7857. When adequate AK/AKI resources are available 7849, then prioritize varying an appropriate optimization(s) test(s) of devices, users, etc. 7858, along with prioritizing varying levels of notification 7859 that said optimization(s) test(s) are being conducted 7859. Then conduct said optimization(s) 7860 and FIG. 241. If, however, sufficient resources are not received 7861 then handle as an error or exception, by means such as described in FIG. 237.

Conduct AKM optimizations: FIG. 241 illustrates the AKM optimizations and improvements process which begins with previously determined optimizations 7862 (see selection of items 7846 7858 with confirmation or obtaining the appropriate AK/AKI resources 7849 to conduct the optimization(s) efforts 7860). Each actual optimization is performed by means previously enumerated and illustrated in: FIG. 228: "Summary of AKM Best Knowledge Creation," an AKM process to create or edit AK/AKI that is tested, validated and optimized for quality. FIG. 229: The AKM "best knowledge" creation process that uses testing to optimize and validate AK and/or AKI. FIG. 230 and FIG. 231: AKM means to obtain data for testing and optimizations processes, as well as improving said testing and optimization processes. FIGS. 232, 233 and 234: The means for content creation or editing, including process, media, tools, etc.

FIG. 241 illustrates an some examples of application of said optimization processes FIGS. 228, 229, 230, 231, 232, 233, 234 to multiple types of optimizations which includes areas such as: Optimizing AK/AKI for devices, tasks, steps, etc. 7864 7865: If AK/AKI is optimized for a device, tasks, step, etc. 7864, this includes optimization(s) and improvement(s) in AK/AKI sent to devices and/or AIDs/AODs during use 7865, which are designed to produce successes by all types of users, in some examples anonymous and/or identified users.

Optimizing user performance and user results 7866 7867: If AK/AKI is optimized for identifiable users 7866 such as paid subscribers, free members, etc., this includes optimization(s) and improvement(s) in AK/AKI such as to raise performance by identified users to targeted levels so they may "leap ahead" from their current performance levels toward "best possible" levels.

Optimizing vendors' devices 7868 (products, equipment, services, applications, information, entertainment, etc.) 7869: So that (participating) vendors can access and/or receive how-to AK to provide leadership performance for their customers 7868, this includes optimization(s) and improvement(s) in vendor communications, dashboards, reports, AK/AKI, etc. that raises performance by (participating) vendors 7869 so they may sell and/or provide devices to their customers that help their customers receive "best possible" success, satisfaction, etc.

Optimizing reporting and dashboards 7870 (including impacts on closing gaps between leaders and laggards) 7871: So that users, prospects, buyers and other members of the public can "leap" to a high levels of success, this includes optimization(s) and improvement(s) in reporting and dashboards 7870 (including various means for progress-driven alerts, events, etc.), which enables "fast follower" progress by a plurality to achieve success 7871.

Optimizing other AKM and AK communications 7872 (including communication channels, media and media types, messaging types, message content, or any other type of AKM communications including all current and future types of AK or AKI) 7873: Other types of AKM/AK communications may be optimized 7872, which can include optimization(s) and improvement(s) in AKM communications with third-parties, targeted audiences (such as a service's subscribers, a performance-based group such as a device's laggards, etc.), etc. 7873; whether by means such as communication channels (direct to devices, to AIDs/AODs during use, etc.), media and media types (such as real-time videoconferencing, multimedia, texting/SMS, instant messaging, etc.), messaging formats (such as templates, boilerplate, etc.), message content (such as wording, the use of lists versus paragraphs, sentence length, etc.).

Each item's optimization continues so long as a threshold of acceptable performance is not reached 7874. If optimization(s) fails and based on results must continue 7863, then to escalate said optimization(s) 7864 7866 7868 7870 7872 re-prioritize varying levels of AK/AKI assistance and notifications to devices, users, vendors, third-parties, etc. 7863. If, however, said item's optimization achieves a threshold of acceptable performance 7874 then log and store result(s) of said optimization(s) 7876, and remove said item from the AK optimization priorities list 7877.

AKM predictive analytics: FIG. 242, "AKM Predictive Analytics," provides some examples of calculations or estimates of the value and/or impact of raising user performance to a higher level by conducting AKM/AK operations and processes. Said predictive analytics starts with data acquisition 7878 as described elsewhere, including identifying items such as the "worst" and "best" in various measured or tracked areas. For each appropriate item calculate appropriate baselines 7879 such as some examples herein: Total gap 7880: For a measured item, the average gap between the (optionally average) "best" and (optionally average) "worst" performers.

Predicted AK EVA (Economic Value Added) 7881: The EVA may be calculated 7882 by means such as using the historic rate of improvement actually achieved by applying AK in that item's user group(s) for that type(s) of device(s) or process (es), multiplied by the size of that group or audience, and multiplied by the historic usage or adoption rate of using its AK/AKI, to yield an estimate of value from providing AK/AKI to the "worst" portions of that group. Optimizing AK EVA calculation method(s) 7894: Said AK EVA calculation method 7882 may be improved 7894 by logging an EVA calculation method(s) employed 7895, and then storing each method's associated accuracy and reliability after optimization results are known 7887, to determine which EVA calculation methods are best 7896, then utilizing the best EVA calculation methods more often 7897, and lowering the frequency of use 7898 of calculation methods that are less accurate. (The same types of improvements may be utilized for each type of baseline and/or calculation employed for predictive analytics.)

After said baselines are calculated 7879 7880 7881 then rank the items by said calculated baselines 7883 (total gaps, predicted AK EVA, etc.). Report calculated items in AK optimization dashboards 7884 and AK optimization reporting 7884 such as by including one or more sections with ranked item lists that are sortable by group, baseline, estimated value (such as amount, number, EVA, etc.), or other metrics. After conducting optimization(s) efforts 7886 and FIG. 241 utilize tracked and measured results data to determine the effectiveness of each optimization method 7887 and improve said optimization method(s) applied by means such as 7818 in FIGS. 238 and 7758 in FIG. 229. If a targeted threshold is reached 7888 sufficient to remove an item from the AK optimization priorities list 7890 then do so and calculate if the predicted AKEVA was reached or exceeded or not reached 7891. Utilize said results data 7887 7888 and calculated baselines 7891 such as the AK EVA to update AK optimization dashboards 7892 and AK optimization reporting 7892, and store said results data appropriately in AKM and third-party storage 7893. If a targeted threshold is not reached 7888 then utilize the latest results data to recalculate both baselines 7889, display said latest recalculation(s) in AK optimization dashboards 7884 and AK optimization reporting 7884, and repeat the optimization(s) as described elsewhere.

AKM controls: One of the means by which the AKM provides for continuous improvement is by continuous visibility of results with self-service management (by identified users, vendors and/or other third parties) of users' AKM record(s), goals, plans, programs, services, triggers, thresholds, etc. FIGS. 243 through 247 illustrate a "wrap around" process for achieving this by integrating self-service management of users' AKM record(s) with results from management choices, so that said choices may be adjusted, tested and improved by those who are affected by said managed AKM record(s): FIG. 243 illustrates two processes that may be performed by a user, a vendor, a governance and/or authorized third-parties including editing a user AKM record(s) and associating a user's multiple profiles together. FIG. 244 illustrates how users, vendors, governances, etc. may select and apply goals to a profile(s). FIG. 245 illustrates how a vendor, governance, etc. may sell a plurality of "packages," "plans," etc. and, when a customer purchases one of them, associate it with said customer's profile. FIG. 246 illustrates how said self-service management by users, vendors, governances, etc. is applied, produces visible results, and those results are used to improve the goal(s) selection(s) described in FIGS. 243, 244 and 245. 247 provides a different view of the overall process of how users, vendors, governances, etc. manage profiles and select goals, how those are applied, outcomes are reported, and profiles improved as a result—in a continuous, repetitive improvement process.

AKM user profile(s) management (by user self-service, vendors, Governances, third-parties, etc.): FIG. 243 "User, Vendor and Governances Profile(s), Record(s) and Identity (ies) Management" provides means for users, vendors, governances and/or authorized third-parties to edit an appropriate user profile(s), AKM record(s) and/or identity(ies), or associate two or a plurality of a user's multiple profiles, AKM records or identity(ies) if said user has more than one. For clarity profile(s), AKM record(s) and identity(ies) are referred to with the single term "profile" or "profile(s)." As a wrap-around process, profile management begins (optionally) from 7977 FIG. 246 7900 FIG. 243 with the results of previous profile management decisions, or alternatively it begins by requesting a user's profile(s), AKM record(s) and/or accessible (e.g., public or permitted private or secret) identity(ies) 7901. After authentication and authorization 7902 are completed successfully, and profile(s) retrieval 7913, a list of profiles available is displayed 7903. If a profile is to be edited 7904, then the profile editing process 7905 may include: Select and display that selected profile for editing 7906; Display preferences, device(s), user ID information, etc. available for editing within that profile 7907; For any preference(s), device(s), etc. selected for editing, display editable options 7908; If the editable options are set correctly the editing process may be canceled 7909 and the preferences, device(s), etc. available for editing within that profile 7907 are displayed; If an editable option(s) needs editing, then edit that preference(s), device(s), etc. 7910; After edits are complete save the updated profile 7911 7913.

If one or a plurality of additional profiles needs editing 7912 from the displayed list of profiles available to edit 7903, then edit said additional profile(s) one at a time 7912 using the profile editing process described here 7905 and elsewhere, including these and various other types of edits, updates and adjustments to users' profiles by means such as: Select a profile, record or identity to edit 7904; Display that selected profile, record or identity for editing 7906; Display the adjustable preferences, devices, etc. available for editing 7907; Select one or a plurality of adjustable preferences and display the editable options for each preference selected 7908; If no edit is wanted then cancel 7909 and return to the display of adjustable preferences 7907; If an edit(s) is wanted then select the editable option(s) wanted 7910; After available edits are complete, saved the updated profile, record and/or identity 7911.

Since one user might have multiple profiles, AKM records, identities, etc., these may be kept separate or associated with each other and managed by said user, one or a plurality of vendors, governances, etc. This may result in one user having one or a plurality of identities, profiles and/or AKM records that are managed together; one or a plurality of identities, profiles and/or AKM records that are managed individually; or two or a plurality of groups of identities, profiles and/or AKM records that are managed as groups. If a user has two or a plurality of profiles 7914, or two or more groups of profiles 7914, or if a user has one profile (or group of profiles) and is adding one or more additional profiles 7914, then once those profiles are displayed 7903 they may be associated with each other 7915 by means such as: Select association of a plurality of profiles, records or identities 7914; Display the list of profiles available to associate 7916; If the appropriate profile (s) is not displayed 7903 7916 or listed 7903 7916, then display profile search 7918, AKM record search 7918 and/or identity search 7918 and search for said profile(s) 7918 7913;

Display the results of the profile search 7919, and select the appropriate profile(s) to add and associate 7920; Whether the appropriate profiles to associate are initially listed 7903 7916, or if they are obtained by searching 7918 7919 7913, then select the group to be associated with each other 7921; After a user's profiles have been associated 7915 7921, save the associated profiles 7922 7913. Then continue the profile management process by identified users, vendors and/or other third-parties in FIG. 244 7922.

AKM goals achievement controls: FIG. 244 "AKM Goal (s) Achievement Self-Service Controls" illustrates how, within any one profile, record, identity (or associated multiple profiles, records, identities) users, vendors, governances and/or authorized third-parties may select one or more goals that may be derived from a set of stored "best goals" or "best goal records" that may be derived automatically or manually from AKM logging of various patterns of AKI/AK usage and the levels of results from said usage, or may be developed by means of individually editing an AKM record(s) and/or goal (s) based on any set of identified user's desires, vendor business ambitions or other types of organizational objectives (such as a third-party as described in FIG. 250). For clarity profile(s), AKM record(s) and identity(ies) are referred to with the single term "profile" or "profile(s)." Goal controls continue from FIG. 243 7922 7924 by entering the goals selection process 7925 to select one or more goals and associate it with a user's profile(s) 7928. If one or more goals is to be selected 7925 or edited 7925, then the goal choices and/or editing process 7928 may include:

Retrieve relevant "best goal records" (from global tracking) 7942 from AKM or third-party databases 7943 where said goals lists 7944 and/or usage patterns 7945 may be generated dynamically by any known database lookup and retrieval means, or may be periodically determined and stored for later retrieval as needed by means described elsewhere whereby: AKM goals list(s) 7944 may be listed by goals as described elsewhere, but for each goal a set of successful user goal records is retrieved so that these may be used as exemplary models for selection, copying and/or adapting and editing; In some examples for the goal of using a smart phone to stay in touch with business thought leaders, articles and new books on how to sell and produce customer lock-down relationships (so that relevant new postings, titles, etc. may be followed and downloaded), a set of successful goal records, preferences and options settings for that goal may be retrieved. AKM usage pattern(s) 7945 include the goal preferences under each goal record so these are copied in automatically when a goal record is copied, and may then be edited or adapted for a user's needs; in some examples for the goal of using a smart phone to stay in touch with the best new business books in the area of business to consumer online marketing (so that relevant titles may be downloaded and read), AKM usage patterns may include editable goal preferences such as delivery frequency of AKI/AK, selection by type of AK, types of alerts and prioritization, and devices in use (DIU), previously achieved levels of user results or rate of success, etc.

After retrieval display the list of goals 7929 and/or goals records that are available 7942, with the expected levels of user results or rate of success 7945 associated with each of them. If a goal is wanted 7930 but not displayed 7929 then display goals search 7931 and search for said goal(s) 7931 7942 7943. Display the results of the goals search 7932, and select the appropriate goal(s) 7933 to add and associate 7934. Whether the appropriate goals to add or edit are initially listed 7929 7942, or if they are obtained by searching 7930 7931 7932 7933, then select the relevant goal(s) and associate/align them for that user profile 7934. If a goal(s) is to be edited 7928 or adapted for a user's needs then begin by displaying a selected goal individually 7935. Within that goal 7935 display preferences 7945 available for editing such as delivery frequency of AKI/AK, selection by type of AK, types of alerts and prioritization, and devices in use (DIU), expected levels of user results or rate of success, etc. For any preference(s) selected for editing 7936 display editable options 7937. If the editable options are set correctly the editing process may be canceled 7938, but if an editable option(s) needs editing, then edit that preference(s)' options 7939 and repeat this editing process 7936 7937 7938 7939 for each editable preference and option desired. After that goal's editing is completed 7935 7936 7937 7938 7939, if another goal is to be edited 7940 then select that goal 7941 and edit its preferences and options as needed 7935 7936 7937 7938 7939. After completing goals selection and association 7928 7942 save the updated goal(s) 7946 to the user's appropriate profile, AKM record(s) and/or identity(ies).

In addition, this may be accomplished by other goal(s) creation, selection and/or editing means described elsewhere. When goals choices and/or editing are complete, continue the profile management process by vendors and/or other third-parties in FIG. 245 7950.

AKM vendor, Governance, etc. controls: FIG. 245 "AKM Vendor Goal(s) Controls" provides means for vendors, governances, other third-parties, etc. to sell and deliver larger plans, packages, etc. right on up to the level of personal levels of success, entire lifestyles, communities, values systems, governances, etc. Each of these may include associated TP profiles, AKM record(s), identity(ies) and related goals to provide measured and assured levels of customer success for an individual customer, a family, an organization (in some examples a business, a local government, a charitable organization, etc.), a group (such as a values or religious community, whether living together or virtual), etc. To accomplish these vendors may include forklift replacement of comprehensive or a-la-carte bundles of products, equipment, tools, services, etc. with equivalents that include known and associated AKI, AK and AKM deliveries during use so that customers receive a "bundle" of higher-level performance with associated targeted AKM achievements and levels of satisfaction. In some examples a "lifestyle package plan" could include housing, transportation, a plurality of devices and services (such as communications [cell phones, Internet, VOIP phones, etc.], personal financial services, etc.), community services, AKM education (including both AKI and AK resources), healthcare, entertainment, nutritious foods, etc.

This enables individual vendors (which may include groups of allied companies, values-based organizations such as religious groups, governances, etc.) to capture and own a growing volume of customer relationships and consumption by using long-term contracts where these vendors replace and provide some or all of those customers' products, services, entertainment, online resources and various other areas of consumption throughout part or most of their lives, perhaps with long-term contracts that are a normal purchase contract, a service or support contract, or any other type of benign and typical business practice that has normal exit options (without any customer lock-in or customer relationship capture intent). Alternately, these purchase contracts may have severe penalties for customers who attempt to leave (e.g., exit or end the contractual relationship without using the limited permitted exit steps or expiration dates stated in the contract, if any), which may be characterized as customer lock-in and ownership in 7952 FIG. 245.

This AKM vendor goal(s) controls continue from FIG. 244 7947 7950 by entering this marketing/selling/contract closing process 7951 to close a customer on one or more plans or packages available and associate it with a user's profile(s) 7952, AKM record(s) 7952, or identity(ies) 7952. (For clarity profile(s), AKM record(s) and identity(ies) are referred to with the single term "profile" or "profile(s).") If one or more plans or packages is to be sold 7951 and closed 7951, then a vendor-directed or third-party directed process for sale (or for optional customer lock-in and ownership 7952) includes all or parts of:

The vendor or third-party (including resellers, channel vendors, governances, etc.) sells 7953 from a list of traditional promotions or plans 7961, or next generation lifestyles or communities 7962. As described elsewhere (such as in FIG. 244) for the plan or package selected by a customer, retrieve the relevant "best goal(s)" record(s) 7958 from AKM or third-party databases 7959 where said goal(s) "packages" lists 7960 7961 7962 may be generated dynamically by any known database lookup and retrieval means, or may be periodically determined and stored for later retrieval as needed by means described whereby: Each plan or "package" 7960 such as Package A, Package B . . . through Package N includes information to tell and/or finalize with the customer such as the package's features, goals, preferences, options, etc., 7960 with the customer's detailed choices and configuration(s) either performed at that time 7956 or done later 7956 after the contract and relationship is complete 7955.

In some examples each plan or "package" 7960 may be similar to current business and marketing practices 7961 such as: Promotions and/or marketing or sales campaigns 7961; Deals and or plans and 7961; Standard products and/or services, including combinations of them as AKM-enhanced packages 7961; Reward programs such as points programs and/or loyalty programs 7961; Etc.

In some examples each plan or "package" 7960 may be revolutionary in scope and considerably more ambitious then current business and marketing practices 7962 whereby customers yield various levels of independence and choice in return for advanced technology services that measure the customer(s)'s performance and results with appropriate AKI/AK deliveries to achieve targeted rates of customer success and satisfaction such as: Selling entire lifestyles 7962 with targeted levels of personal (or family) success and satisfaction, such as career-focused lifestyles, children and family-focused lifestyles, volunteer service-focused lifestyles, social connections-focused lifestyles, entertainment-focused lifestyles, travel-focused lifestyles, adventure-focused lifestyles, fad-focused lifestyles, party-focused lifestyles, etc. Selling membership in real and/or virtual communities 7962 or values systems 7962 with customers able to be in a plurality of communities and/or values systems at one time, including AKI/AK guidance on how to join, participate and succeed in each, with some examples of virtual or real communities and/or values systems such as family and children; health and fitness: nutrition are eating (such as vegetarian or organic); lifecycle stage such as college, young adult, parents, mature empty nester, adult dating, retirement, etc.; ethnic-focused such as African-American, Jewish, Muslim, etc.; religious-focused such as Christian, Buddhist and, Jewish, Muslim, etc.; environmental activism; gender-focused such as women's groups; pets such as dogs, cats, reptiles, etc.; activities such as boating or skydiving; etc. Selling membership(s) in governances 7962 which may include multiple types of governances FIGS. 248, 249, 250, described separately under new types of governances.

In some examples if a prospect does not buy 7954 then this process ends 7965. However, if a prospect does buy 7954 and becomes a customer 7955, then commit what that customer purchased to that customer's profile(s) 7955. As needed (and optionally) display, select and edit the goal(s), preferences and options 7956 as described in more detail elsewhere. If any edits are performed to the package's goals, preferences, options, etc. before or after a customer's profile has been updated 7956, then save those edits to said customer's profile 7955. After completing the vendor or third-party sale (or optionally a customer lock-in and ownership process) 7952, then implement the plan or "package(s)" sold 7958 7955 7956 to said locked-down customer, by (optionally) shipping and replacing some or all of said customer's current products and services 7964 to deliver "bundle(s)" that may provide higher-level AKM achievement(s).

In some examples, this may be accomplished by other goal(s) creation, selection and/or assignment means described elsewhere, in some examples including governance processes that are described elsewhere. When AKM vendor goal(s) controls are complete then this overall user, vendor and third-party profile management process ends 7965.

AKM visibility of success/failure from control choices: FIG. 241 "AKM Continuous Visibility of Success/Failure from Goals/"Packages" Choices" provides a linear description of the process illustrated in FIGS. 243, 244 and 245 and provides for visible results from purchased goals "packages", so that inadequacies may be responded to, corrected, etc. if needed. For clarity profile(s), AKM record(s) and identity (ies) are referred to with the single term "profile" or "profile (s)." This iterative, continuously improving process includes: Modifying personal profile(s) 7970 by selecting goal(s), preferences, options, vendor(s) "packages," and/or other of available choices (as described in FIGS. 243, 244 and 245); Generating AKI/AK action(s) 7971 by the AKM based on the user(s) profile(s), to fulfill the user(s)' goal(s); Providing AKI/AK to the user(s) 7972 including alerts, reminders, etc.; Notifying user(s) of performance that is above, at or below target(s) 7973 by means of AKI/AK, alerts, reports, dashboards and other communication(s); As needed, performing corrective action(s) 7974 that may include steps such as automated alterations in a user's profile settings for the delivery of AKI/AK during tasks, reporting, other communications, etc.; Displaying the status, report(s) or dashboard(s) of the achievement(s) of the user(s), including at least one of the goals selected 7975, and metrics for the achievements to date, with (optional) comparison(s) and gap(s) from goal(s) and/or "best possible" so that the user's current status relative to targeted goal(s) is provided; Based on the user(s) results and progress toward goal(s), providing means for selecting revised profile(s), goal(s), preferences, options, vendors' package(s), and as a result revising the AKI/AK delivered for the user(s) current products and services 7976; The means for performing these goal(s) selection(s), edits, etc. forms a continuous process of improvement by returning to the initial step 7976 7970; The detailed process for performing these goal(s) selection(s), edits and profile association(s) starts in FIG. 243 7977.

FIG. 242 "AKM Continuous Visibility of Success/Failure from Goals/"Packages" Choices" illustrates an iterative continuous improvement description of the process illustrated in FIGS. 243, 244, 245 and 246, showing some additional ways that corrective actions and modifications may be made any time as needed, to produce continuous improvements in results from purchased goals "packages." For clarity profile (s), AKM record(s) and identity(ies) are referred to with the single term "profile" or "profile(s)." This circular, continuously improving process includes: As described in FIGS. 243, 244 and 245 create or edit one or more users' profile(s) 7980, including the users', vendors', governances', etc. goal(s), preferences, options and/or "package(s)" (which may include traditional marketing and sales such as promotions and campaigns, deals and plans, products and services packages, reward or loyalty programs, etc.; and may also include vendor or third-party customer lock-in and ownership marketing and sales of lifestyles, real or virtual communities, values systems, etc.). Based on the settings in each said edited profile(s) run the appropriate AKM processes that obtain and deliver each appropriate type of AKI/AK 7981. Conduct the AKM interactions during use of devices, etc. 7982 including: Deliver AKI/AK at the in-use steps and stages of usage when each type of AKI/AK is needed, useful or desired 7982. Deliver alerts, reminders, advertisements, subscription or membership offers, etc. 7982. By means of reports, dashboards, other types of AKM communications, etc. 7983 notify each user of performance, such as performance that is above or below said user's set or edited goals 7983, and/or targeted goals that are included in a "package(s)" 7983. By means of (optional) tracking and/or measurements 7983, perform corrective AKM actions 7983 7982 as needed until each user's targeted goal(s) 7981 are reached. At the AKM level, track, measure, optionally store for retrieval, and report results and outcomes 7984 including devices, users, vendors, etc. Provide continuous improvements by performing optimizations 7985 as described elsewhere. Also provide continuous improvements by performing optimization's methods improvements 7986 as described elsewhere, including metrics, processes used for testing, optimization, measuring, tracking, reporting, etc.).

These form a circular, continuous improvement process 7984 7985 7986 7980 by repeatedly returning to the initial step: The results achieved 7984 by actual usage 7981 7982 7983 drive successive rounds of improvements 7984 7985 7986 that are made by the user, vendor and third-party editing processes 7980 described herein in FIGS. 216, 217, 218 and elsewhere.

AKM GOVERNANCES: With self-management covered a larger purpose comes into view, and that is new options for collective improvements by means of governance(s) that open new fields that differ from present instantiations of the nation state and their varied governments and political philosophies.

At this juncture this AKM now moves from processes for acquiring and delivering knowledge from individual activities to using collective activities for purposes of group or collective improvements under the term "Governances" (illustrated herein in FIGS. 248 "IndividualISM," 249 "CorporatISM," and 250 "WorldISM"). By surfacing activity-level, device-level, vendor-level, market-level and other in-use data so that individual activities are made visible and accessible, an AKM aggregates purposeful activities as indicators of implied collective desires for personal success and satisfaction, which can be translated into governance processes that expand the opportunities (as well as providing new governance concepts, systems and institutions) for applying resources and processes that are controlled by a group (herein a "governance" with some of many possible examples being Individuals [FIG. 248], Corporations [FIG. 249], and Centralized Global Governance [FIG. 250]) to raise the rates of success and satisfaction for each type of governance's groups and sub-groups (in some examples its members, subscribers, etc.) and its business associates (in some examples its suppliers, affiliates, partners, distribution channels, agents, etc.). In short, as the AKM identifies, tracks, measures and makes visible the gaps between activities, chosen goals, additional derived goals implied by activities, and various measured failure and success rates, those gaps may be directly tackled and reduced by governance (e.g., collective actions) means, to achieve those chosen and implied goals for groups as well as as well as by the other means described in the AKM for individuals.

New technology is related to economic growth (as described elsewhere). Some examples of this growth are new economic options such as new industries (in some examples the emergence and growth of new Internet-focused industries), and the resulting transformations of lives and societies from those industrial activities. In parallel ways, new technology is related to new options for governance that may emerge throughout history such as the emergence, growth and evolution of the nation state which (in large part) emerged from the rise of the middle class, public education and urbanization which are in turn related to historic economic industrial transformations, and also produced resulting transformations of lives and societies. In a similar way, new technologies, processes, systems, etc. may be created so as to provide new options for "governance" which are described herein. The AKM is one advance that could provide new types of "governances" since it is embedded (in whole or in part) in devices used in activities to alter how well they work for people, and that is employed to increase the performance, results and/or processes of a plurality of organizations, industries, social institutions, etc. Because the AKM is politically "agnostic," it may provide multiple types of governance simultaneously in our increasingly networked society. A broad description of this governance component of the AKM is as follows:

Current economic background: There are deep connections between macro-indicators of economic progress including macro-level actions and policies, and micro-level activities throughout the economy. In some examples Stock markets embody collective macro judgments based on some of the most thorough news and information systems ever available. In addition to the price of individual stocks, the collective judgment of a market is embodied in indices like the Dow Jones Average, the S&P 500, etc. Moreover, there are a variety of different markets such as the New York Stock Exchange, NASDAQ, the Chicago Commodities Exchange, not to mention other national and regional markets in virtually every part of the world. These individual stock valuations and diverse indices are macro indicators of the success or failure of large numbers of fine-grained, individual economic transactions. Each transaction represents the needs of a buyer, the costs and needs of a seller, and the quality, scarcity or abundance of the raw material, product, service, etc. being purchased. Based on the price set by each of these fine-grained transactions, without any central authority being involved, and based on the resulting indicators of supply, demand, and prices other people and organizations buy and sell that material or product in greater or lesser quantity, in more or fewer distribution channels, and related economic activities are expanded or contracted (such as promoting that item or investing in R&D for a next-generation product). Thus, the aggregation and provision of data about economic activity and its combined results inform subsequent individual and group decisions, policies, business processes, behaviors, etc.

Historic economic background: Economic growth rates during the Middle Ages were nearly flat. For centuries at a time, successive generations did not see any improvements or changes in their standard of living. Economic growth began in earnest with the start of the Industrial Revolution, which included three developments among a plurality of others. The first was the rise of industry, which gave its name to the revolution. The second was the rise of innovation and inventiveness which created new technologies and processes of manufacturing, new products that were sold by new distribution and retailing systems, and communications/publishing that spread new information and new knowledge. Also helpful was the rise of capitalist "free markets" with a price system that efficiently sends its signals throughout the local through global economy. As networking has grown and systems of communication have accelerated, the power of inventing new technologies has been directly linked to wealth creation. The purist form of this has emerged in Silicon Valley, where (it has been said) more wealth has been created in one place a shorter period of time then any place and time in human history.

Political background: Capitalism is not "Democracy" nor is it "Freedom". Just because in advanced Western free market capitalist countries the working-class prospered, became a large middle class and moved to the suburbs where they were surrounded by overflowing shopping malls, schools and the ability to give their children advanced educations and good jobs, does not mean Capitalism and Western political freedoms are mutually related. Capitalism can thrive and prosper under any type of governance so long as it supports what Capitalism and capitalist organizations need. Consider China (which remains Communist yet has one of the strongest capitalist economies with a higher rate of economic growth than nearly all "developed" OECD Democracies), and the Middle East (whose countries are largely feudal monarchies and dictatorial theocracies yet have one of the fastest and largest acquisitions of [capitalist] wealth in history). What is clearest from capitalism's success under all types of government is that free markets and open competition perform better for economic growth than most economic plans and decisions made by the public sector (whether a government is democratic, socialist, communist, dictatorial, theocratic, etc.). The historic evidence is thus that free market capitalism is not a political system, nor does it have that much to do with political freedom, democratic government, or many "human rights."

Differences between Capitalism and Democracy: Capitalism does affect "governance" because it has a strong influence on every type of government toward providing capitalist organizations with acceptable political conditions under which they can prosper and grow in size, wealth and economic power. American ideals include the dreams, aspirations, values and economic hopes of the American people. Yet the American government is far from an unquestioned champion of peace and democracy, whether with its own citizens or around the world. Often, the U.S. Government is seen as having great police and military power, as well as great willingness to use them. Instead of focusing on America's larger ideals like justice, human rights, compassion and the notion that all people are equal and deserve to be treated fairly by their local government, in America the inclination for economic success may (but not always) trump the nation's aspirations with economic interests being served first. In the American ("representative democracy") government this is due to the central requirement for campaign financing, because candidates with large amounts of financing are able to compete and have a chance of winning. In short, the need to raise huge and constantly growing amounts of money for campaign financing alters who is actually "represented" in America's "representative democracy," and focuses government decisions economically whether they are setting foreign or domestic priorities, whether they concern subsidizing the rich or uplifting the poor, or whether large and influential corporations are regulated or allowed to act freely in their own interests. While there is no longer any question about the economic value of lower taxes, free markets, reliable legal systems, less intrusive government, etc.; too often a main objective of elected Congressional politicians is to support wealthy and powerful corporations and people that in turn finance their re-elections.

Summary: To the extent that free market capitalism is a separate system that stands apart from any type of government or political philosophy, it can be seen to generate prosperity under democracy, socialism (such as in Europe), communism (such as in China), monarchies and dictatorships (such as in the Middle East) and theocracies (such as in Iran)—so long as capitalism secures for itself the right conditions (which it often does by obtaining a voice, influence or power in its local government). It is free market capitalism under stable laws (such as attempts to limit corruption), not any system of government, that has created more prosperity than any political system in history. Personal freedom and human rights are protected by governments that defend them, while free market enterprises seek to control government decisions for their own economic interests, with less regard for what people require in order to have free and successful individual lives.

This analysis does not mean crusading against "Capitalism," which would not make sense since free market capitalism is the actual system and engine that has created more prosperity and wealth than any other system in human history. Nor does it mean returning to some type of utopian stateless, communal bliss that abandons nation states and their governments. Such conflicts, revolts or revolutions have little value in modern societies, which may even accelerate worldwide wealth creation and prosperity beyond the historic successes achieved over the previous two centuries of industrial capitalist growth. Capitalism remains the strongest force that has delivered widespread prosperity and so it deserves both recognition and support due to its numerous achievements and continuing efforts, even if it openly claims that to succeed it needs to be a major influence in many countries' governments (as it openly contributes to the U.S. Congress, and openly participates in numerous U.S. government regulatory proceedings and decisions in some examples).

In spite of Capitalism's frequent economic, political and historic successes, and though Capitalism clearly works better than public sector planning for economic growth, "free markets" are far from ideal. Markets have numerous problems and inefficiencies that cost companies, customers and societies enormous amounts of time and money: Every vendor, in some examples wastes scarce resources on unnecessary production, poorly performed services, mis-directed distribution, and ineffective marketing expenditures. On the other side of the cash register, consumers spend inordinate amounts of time trying to select the right product for each of their needs, then also incurring often excessive costs for finding where to buy the product, traveling to and from buying it, installing (and often attempting to configure) it, and learning how to use it effectively. Customer choice is often limited and controlled by flawed markets such as occurs from oligopoly or monopoly power, such as by the concentration of market power in a few large companies who often buy or obstruct smaller competitors. These "industry-leading" companies may force consumers to buy a limited range of products (such as in PC operating systems and office software), sometimes with high prices and lock-in contracts (such as in mobile communications). What is missing are the "free market" competitive pressures that would otherwise force these large companies to innovate sooner, raise product quality, lower prices or provide free choice—sometimes all at the same time. In addition to direct transactions, market inefficiencies cost societies resources that are used to fund "public" or "safety net" services such as Social Security, health-care, etc. Other societal problems, such as unemployment and replacing deteriorated infrastructure (such as bridges), are similarly underfunded due to reduced productivity and inefficiencies that cost economic growth and tax revenues.

Is an economic and political synthesis possible, one that expands our economic horizons and provides new "governance" options at the same time, without a conflict with nation state governments? The AKM enables a new class of human "governances" that may affect groups' success and prosperity, and may also provide improved capitalist operational success, satisfaction, efficiency and other benefits. Like other new technologies and like free market capitalism, the AKM's governance components are independent from any political philosophy and can operate under any type of government or political system. The governance contributions of the AKM are generally applicable to network-based activity in any country or market, under any form of political, social or religious philosophy.

For purposes of illustrations and examples, this AKM discusses and exemplifies some new types of governances among entire ranges of new types of governances that are possible:

IndividualISM Governance: An IndividualISM is the expansion of self-control to personal sovereignty and self-governance by individuals who are members of one or more. IndividualISMS, to select their own goals and provide them expanded means to achieve them. IndividualISMS are governed by individuals but may compete directly with corporations by using alliances and partnerships to acquire products, services, etc. to sell as bundled solutions to their own members (such as for a complete lifestyle). Thus, a high-performance IndividualISM may grow to compete nationally or worldwide, such as to provide a variety of humane ways to satisfy people's needs for products and services that actually make them as successful as those individuals choose to be. In some examples could be an IndividualISM that operates an economic enterprise such as "Customer Control, Inc.", described below, and achieves economic success through complete integration between customers and vendors—all of its management and systems are designed and operated for complete support of its customers wants and needs. As with all AKM governance components, multiple IndividualISMS may exist simultaneously to provide and deliver different types of values, capacities, qualities of life, outcomes, etc. Similarly, one person, family or household may join two or more IndividualISMS to obtain benefits provided by each of them.

CorporatISM Governance: A CorporatISM is the expansion of corporate activities into a governance, in which one company through collective groups of companies (such as alliances or associations) may provide larger ranges of devices, products and services to meet an individual's consumption and/or success needs on a larger scale, such as across an entire lifestyle for decades or a lifetime. One or more CorporatISMS may be sold to Members who have a deeper customer/contractual relationship to one or more CorporatISMS than typical vendor-customer contacts that are merely one purchase at a time. CorporatISMS are governed by one company or an alliance of companies, but may collect and sell components (right through complete lifestyles) such as including homes, automobiles, supermarkets (food), schools, entertainment, education, financial services, community(ies) services, and the small businesses within those communities, as more complete ways to satisfy people's needs for one choice that provides them most of the goods and services needed in a complete life. As with any type of AKM governance, multiple CorporatISMS may exist simultaneously to provide and deliver different groupings of plans, subscriptions, products, services, goals, outcomes, etc. Similarly, one person or family may join two or more CorporatISMS to obtain the collective benefits provided by all of them.

WorldISM Governance: A WorldISM is the expanded centralization of governance intended to drive human success across national boundaries by means of technologies such as the AKM, independent of whether each WorldISM is based on a political philosophy, economic organization (such as a capitalist corporation, nonprofit "cause" organization, charity, etc.) or human goals (such as any group's values, beliefs, commandments, aspirations, dreams, fantasies, etc.). A WorldISM is centrally governed and provides a way to expand the reach of a single organization(s) more broadly into people's lives to guide them, but without needing to be a political entity or government. As with all AKM governance components, multiple WorldISMs may exist simultaneously to provide and deliver different strategies and tactics for producing human success on a broad, international scale. Similarly, one person or family may join two or more WorldISMs to obtain benefits provided by each of them.

Multiple simultaneous IndividuslISMS, CorporatISMS, WorldISMs and other AKM governances ("GOV"): As with all AKM governance components, multiple AKM GOVs may exist simultaneously to provide and deliver different approaches for producing human success. Similarly, one person, family or household may join two or more different types of AKM GOVs to obtain benefits provided by multiple types of governance at once. In some examples one identity may join multiple GOVs. In some examples one person's multiple identities may each join one or a plurality of GOVs. In a parallel analogy, optical multiplexing delivers many times the bandwidth of one laser beam of light by dividing it into multiple colors (where each color is a separate wavelength and carrier signal; known as WDM or wavelength-division multiplexing). Similarly, the AKM both creates a new "governance" alternative (including systems, methods, processes, transformed devices and how they are used, etc.) AND it also divides "governance" into multiple types that can operate simultaneously to provide humanity with many more types of governance capacities and benefits at one time—multiplying the AKM's group contributions to collective successes, in parallel with its personal contributions to individual successes.

Together, the new AKM governance forms (some examples herein include IndividualISM, CorporatISM and WorldISM), plus any other GOVs based on employing this governance innovations, are collectively referred to as a "governance" or "governances" (plural). Any type of governance may operate under any type of nation state government such as democracy, socialism, communism, dictatorship, theocracy, monarchy, etc. Any type of philosophy may be promoted by any governance, such as any type of community or value system (in some examples an economic lifestyle goal such as luxury living, a cultural filter such as a family values community, a spiritual focus such as a religious community, a social responsibility such as an environmental lifestyle community, an interest such as fashion in general or the latest fad in particular, etc.) may be provided by an IndividualISM, a CorporatISM, a WorldISM, or another type of governance.

Also, all types of governances may operate simultaneously and either separately or together in combination(s), so a person, family, household, etc. may enjoy one or a plurality of governances at one time. Thus governances may let people make a historic new choice: They may step on a larger governance stage than the one provided by the current institution of "government" and its available role of "citizen." When separate: An individual governance does not prevent any other governance from operating, so multiple types of governances may now come into existence alongside nation states. When simultaneous: Multiple instances of each type of governance may exist simultaneously (such as multiple CorporatISMS), and multiple types of governances may be provided in combination (such as IndividualISMS co-existing and even partnering with CorporatISMS and/or WorldISMs). An individual's membership in multiple governances is concurrent along with "citizenship" in that person's nation state government. Thus, multiple and varied types of governance benefits may be received simultaneously by anyone who participates in two or a plurality of governances. When in combination(s): Even though each new type of governance may operate differently from other new types of governance (e.g., a governance based on decentralized individual control is run differently from a governance based on corporate enterprise economic control with its customer management, which is different than a values governance based on worldwide central control, which is different from governances based on other "GOVs") they share common features; that is, they operate in some ways that parallel each other. Thus, this AKM governances innovation(s) comprise a range of common systems, processes, features, capabilities, etc. that may be shared (such as membership or subscription services)—or those common systems may be provided to multiple governances by a third-party service(s), by a utility (such as the TPU), etc.

Some of the shared features may include one or more instantiations of each type of governance: As illustrated each type of governance may be a template or system that may be applied two or a plurality of times. In some examples there may be two (or multiple) "IndividualISMS," each managed or run by a separate group of individuals who comprise its members, its subscribers, or however it defines its participants, and each instantiation may copy and adapt the same template, systems, etc. Reusable templates, systems and other components apply to each new type of governance illustrated herein and may also be applied to new types of governances that may emerge in the future. Governances also differ from a nation state government, where a type of government is a monopoly and can only be replaced by a transformation into a different government with different "rulers," such as by a "revolution." Governances are not monopolies and may co-exist, side by side, with multiple governances of the same or different types. Governances may be self-replaced by members' decision (by various means such as elections, board decisions, committees, etc.), evolution, merger, partnership, alliance, bankruptcy, dissolution, etc.

Some of the shared features may include multiple instantiations with benefits from associations of governances: With governances there are advantages to having networks of governances, such as in some examples CorporatISMS, since this may stimulate the development of support services and outsourced capabilities for other governances. That larger "ecosystem" effect benefits other existing Corporatisms as well as making it easier for new types of governances to form, as well as benefitting the "members" or "subscribers" who rely on one or a plurality of CorporatISMS.

In some examples a governance may or may not be an economic institution: A governance may or may not engage in direct economic activity itself. While economic activity is optional, each governance requires some form of revenue(s) that exceeds its cost(s).

Aggregated human activities and goals data: At one level, each type of governance aggregates members' activities data, goals data, levels of success and other metrics, as well as other measures and indices of their economic and other activities. These may include goals, demand, desires, economic behavior, quality of life measures, satisfaction, performance, problems with products received, use of AK and/or AKI, etc.: This type of data may include both large and small goals, actual expenditures in pursuit of each goal and the rate of development of new products, services and knowledge that has the potential to satisfy members' goals or raise their activity(ies) to a higher rate of success or performance. The display may be in the form of statistics, tables, graphs, charts, reports, etc. The media of display may include Web sites, email, broadcast (whether Web-based or over traditional broadcast media), paper publications of various types, etc. The audiences may be universal (e.g., public and local through worldwide) or access may be private and restricted to "members" of a governance (which may be by decision of that governance, or it may include any number and types of related audiences such as investors or lenders who provide capital, companies that participate in delivering products and services, alliance or trading partners, registered members, unregistered members of the public who consume certain products and services, contractors or third-parties or professionals who perform research, government agencies, or anyone else the governance chooses to include.

Visible reporting such as aggregated, gap analysis, by subgroups and area, etc.: At this same level the governance aggregates the activities, goals and other data into an active, (near) real-time reporting and/or dashboard system where the data provides: Quantitative indicators of members' goals (including any combination of governance providers and/or consumers, and any activity(ies) performed. Quantitative indicators of current performance of said governance's members, relative to their goals, in much the same way as an individual company's dashboard indicates its current achievement of its stated goals. Quantitative indicators of current performance of that governance as a whole, relative to its the Netocracy's performance goals, in much the same way as a stock market index indicates the current valuation of the set of companies that comprise that index. The gap between a governance's goals and its current performance. All of the above reporting, and more, for various sub-groups and areas (where the areas include the governance's functions such as governance, administration, membership, operations, business, AKM machine, systems, etc.).

Aggregated political activities when there is (optional) self-government, democracy, elections, individual "sovereignty", etc.: At this same level the governance aggregates the self-directed choices, "votes," desires and activities of the members of the governance: These may include solutions desired by members of the governance to reduce or eliminate the gaps between goals and current performance. These may include direct or formal decisions about recommended solutions such as from individual actions, voting, decisions by democratically chosen managers or regulators, or any of a wide variety of individual or democratic means and procedures. These may include indirectly or informally gathered solutions such as from surveys, feedback during or after activity(ies), optimization processes, tests, innovative solutions that come from new technologies, services, products, or any of a wide variety of methods for aggregating members' opinions, needs, goals, etc. These may include periodic or real-time governance reporting systems, to provide the full membership with the current status of governance results such as members' goals, performance data, gaps between goals and performance, recommended solutions, etc. These may include occasional, periodic or constant political involvement activities, to provide members with hands-on involvement options, such as direct democratic governance, citizen initiatives at the ballot box, participation in regulatory boards or administration, open-ended solicitations of others involved in various decision-making processes, open political viewpoint contributions, or any other legitimate and/or democratic means of political involvement.

Economic and political growth activities: At this same level the governance may take organized and systematic action to foster and support the achievement of its goals on a larger scale: To increase the number of members in that governance it may recruit new members such as by providing AKM or other products and services that identify non-members who share similar behavior, needs, goals or characteristics and are likely to experience the same dissatisfactions and gaps as the citizens of that governance and therefore appreciate the benefits of membership in it. To increase the financial resources and the magnitude of the voice of the governance it may engage in any legitimate form of business activity, including forming alliances, partnerships, mergers, etc. with other governances, corporations or organizations interested in solving the problems and gaps identified by that governance and its members. To increase in the abilities of that governance's members to solve their problems or gaps, it may develop, acquire a and/or package solution knowledge that it may distribute to its members or provide to others for a fee (in some examples as an outsourcer) who it might assist with creating, marketing, implementing, or satisfying the needs of its members or others outside that governance.

This new class of governance options also includes higher levels of implementation and/or aggregation. In some examples there may be replication of multiple governances: These may include fast startup replication by re-using known patterns, existing systems, etc. as reusable templates and/or components. Includes fast capabilities acquisition by not having any prohibition(s) on re-using, reselling, etc. any business systems, by being able to form alliances that share services, operations, etc. Includes systematic visible results reporting across multiple governances, for comparisons, so prospects and potential members can see which governances are best for achieving various types of personal goals, and which are not. May includes shared membership services so each individual may join multiple governances simultaneously, and have their one or a plurality of profiles managed co-operatively rather than separately or competitively.

In some examples another higher level of implementation may include aggregation of multiple governances: These may include an aggregated governance of governances, whereby multiple governances may form an association(s), alliance(s), partnership(s), collective(s), merger(s), etc. by any legal means so that all are supported by their common goals and operations (such as making their combined memberships more successful in whatever ways their members choose to live). Although some types of governances have been shown and described in detail, along with variants, a plurality of additional types of governances may be constructed and included or integrated into separate or third-party system(s) or machine(s). In the examples for governances the components may consist of any combination of devices, components, modules, systems, processes, methods, services, etc. at a single location or at multiple locations, wherein any location or communication network(s) includes any of various hardware, software, communication, security or other components.

INDIVIDUALISM—PERSONAL SOVEREIGNITY IN DECENTRALIZED GOVERNANCE(S)—("GOV" 1 OF MANY): FIG. 248 "IndividualISM—Personal Sovereignty; Decentralized Governance ("Governance" 1 of many)" illustrates one of the AKM's components that may be used to raise the rates of success and satisfaction for one (or a plurality of possible) type of governance groups and/or sub-groups. In this case an IndividualISM Governance is the expansion of self-control to personal sovereignty and self-governance by individuals who are members of one or more IndividualISMS to select their own goals and provide them expanded collective means to achieve them. As illustrated herein an IndividualISM 10200 FIG. 248 has a plurality of sub-components including: Central visible results 10229 from ISM-wide reporting 10230; Administration 10201; Self-controls 10208; Membership 10212; Technology 10218; Business and finance 10224; External communications 10231.

It is the new combination of IndividualISM governance components, to achieve new benefits, that is part of what is disclosed. The components that are disclosed and combined herein to produce some examples of a governance include:

Central visible results 10229 from IndividualISM-wide reporting 10230 (whether one or more IndividualISMs): Data from each area flows to central reporting 10229 10230 which provides current and historical information (such as reporting and dashboards as described elsewhere) so that this governance's performance is clear to its members 10212 10208, administrators 10201, employees who run or work in its systems 10218 and operations 10224, as well as those who work with this governance from outside of it 10231. In some examples while complete detailed reporting is optional, some of the areas reported may include that IndividualISM's goals, measured results, gap analyses between goals and results, etc., where those are reported in aggregate for the whole IndividualISM, for major subgroups, and for each area such as each member(s), device, service, product, system, outsourcer, vendor, sponsor, partner, etc. By means of this area's visible results 10230 an IndividualISM, its members, administrators and employees are able to produce and achieve continuous improvements such as by processes illustrated.

Administration 10201: A first administration option 10205 is the election of administrators such as directors, committees, representatives, (the equivalent of) "union" leaders, etc.; ideally there should be short term limits (such as two terms) so these positions remain democratic (and don't become lifetime positions with nearly guaranteed re-election such as in Congress). A second administration option 10206 is systems-based such as results-driven selections of administrators, auctions that maximize revenue, etc. Regardless of how administrators are selected or determined 10205 10206, administration includes: Regulation and administration 10203 may by done by any forms that reflect the involvement of members or subscribers such as employees, boards, committees, representatives, members, etc. Business management 10202 may be done by employees, representatives, members, etc. with job maintenance based on results achieved 10229. Revenues 10204 may be kept to fund an IndividualISM's operations or increase its economic strength, or revenues may be divided with members, used for promotions to attract new members, or for any other business purpose.

Self-controls 10208: In an IndividualISM, members or subscribers have control (and responsibility) for their own profile 10209, or for their family or group's profile; this differs from other governances where others may own a user's profile (such as by contract), or have governance over it (such as by regulatory authority over members' range(s) of choices and permitted behavior(s). One option is democratic self-control 10210 which may include elections, ballot initiatives, voted changes in governance, etc.; if not included, other forms of individual-controlled governance would be used.

Membership 10212: User profiles are controlled by each member 10213, including member-supporting policies that are decided by each IndividualISM, negotiated with its vendors and administered by each IndividualISM; in some examples a member might cancel and/or leave each vendor relationship at any time each member chooses. Similarly, the local policies of these governances 10214 are controlled by each member and may differ for each person, if an IndividualISM decides that is its overall policy. Similarly, the "commercial packages" of these governances 10215 may be decided on an a-la-carte basis by each member if that is negotiated by each IndividualISM with its vendors, including individually selected bundles of decides, services, etc. In a similar way, non-commercial processes 10216, which include any "public" services provided by the IndividualISM that are analogous to roads, education, etc. provided by government, are managed by local groups that receive those services; in some examples is lifelong continuous education delivered with AKI as AK links with follow-up services, designed to fit each individual's needs by integrating it during or after their AKI interactions.

Technology 10218: Technology 10218 10219 includes the AKM and the IndividualISM's use of the AKM and its reporting, the IndividualISM's business systems, and other uses of computing, communications, etc. for its operations and management: One technology option is for outsourcing to provide AKM services and business systems; Another technology option is for the IndividualISM to provide these; A third technology option is a hybrid that includes both outsourcing and local IT. Regardless of how AKM, business systems and technology uses are provided, technology includes: Communications 10220 including devices, AIDs/AODs, accessibility, security, etc. to provide AKM/AKI/AK and other interactive communications whether real-time interactions (synchronous) and/or store-and-forward (asynchronous) forms of communications; Scope determination 10221 including users, triggers, thresholds, actions (such as Direct AKI), etc.; Technology rules and policies 10222 which includes governance issues that, in an IndividualISM, might include options that can be controlled by each member (such as described in FIGS. 243 through 247 and elsewhere.).

Business and finance 10224: These include components and business relationships that are authorized by administration 10201 as well as those that are unauthorized (which are independent and may or may not be acceptable), some of which are comprised by: Components may include devices, products, services, equipment, systems, etc. 10225; Suppliers may include vendors, outsourcers, etc. 10226 who provide components, services, systems, etc.; Partners 10228 may include corporations, non-profits, charities, schools, governments, other governances, etc.; Sponsors and affiliates 10227 may include advertisers, sponsors, partners, allies, etc. which may be direct relationships, network-based, supply chain-based, distribution and sales chain-based, etc.

External communications 10231: External communications 10231 may mean integrated operations, technologies, business systems, etc. with other governances, companies, institutions, governments, etc. that are outside of this governance.

CORPORATISM—CORPORATE BUSINESS GOVERNANCE(S)—("GOV" 2 OF MANY): FIG. 249 "CorporatISM:—Corporate Governance ("Governance 2 of many)" illustrates the expansion of corporate business activities into a collective organization of corporations. In this, one company or a collective group of companies may provide larger ranges of devices, products and services to meet a customer's needs on a large-scale such as across an entire lifestyle for decades. In this case a CorporatISM Governance is the expansion of business relationships between a company(ies) and its (their) customers to sell and deliver a more complete or wrap-around bundle(s) of the goods and services needed in most areas of life, by customers who are members of one or more Corporatism's "packages" or "plans", to provide those customers with expanded collective means to achieve and receive a successful life. As illustrated herein a Corporatism 10232 FIG. 249 has a plurality of sub-components including: Central visible results 10263 from ISM-wide reporting 10264; Management 10233; Self-controls 10240; Customers 10246; Technology 10252; Business and finance 10258; External communications 10265.

It is the new combination of CorporatISM governance components, to achieve new benefits, that is part of what is disclosed. The components that are disclosed and combined herein to produce some examples of a governance include:

Central visible results 10263 from CorporatISM-wide reporting 10264 (whether one or more CorporatISM's): Data from each area flows to central reporting 10263 10264 which provides current and historical information (such as reporting and dashboards as described elsewhere) so that this governance's performance is clear to its managers 10233, customers 10246 10240, employees who run or work in its systems 10252 and operations 10258, as well as those who work with this governance from the outside of it 10265. In some examples while complete detailed reporting is optional, some of the areas reported may include that CorporatISM's goals, measured results, gap analyses between goals and results, etc., where those are reported in aggregate for the whole CorporatISM, for major subgroups, and for each profit center or product group such as each device, service, product, "package", "plan", business system, market or market segment, geographic region (such as a country, state or metropolitan area), vendor, outsourcer, partner, or any other reporting group that is appropriate to understand its business results. By means of this area's visible results 10264 a CorporatISM, its managers, employees and customers are able to produce and achieve continuous improvements such as by processes illustrated.

Management 10233: A corporation is not a democracy so managing a CorporatISM is like managing a corporation: The business's managers are in control regardless of the type of model employed. A first management option is a single corporation 10237 that owns and runs the entire Corporatism, which is a direct parallel to managing a corporation—just one with a larger scope and ambitions. A second management option is a Keiretsu 10238 (adapted from the Japanese) which is a group of enterprises that have interlocking businesses and business arrangements, generally with one or a small number of dominant companies, that have both operational independence and permanent relationships with the other firms in the group (which in some countries like Japan may include stock ownership in each other). A third management option is market-based group membership 10239 such as by long-term supply chain contractual relationships, competitive bidding, a trade association(s), alliance(s) or group partnership(s), competition(s) for group membership (such as "best wins"), etc. Regardless of the management model 10237 10238 10239, management includes: Management of business units and functions 10234 which can be independent if multiple separate companies are included; integrated if there is either one company or integrated operations between multiple companies; etc. Regulation and administration 10235 which, as in most companies and businesses, are by direct management decision and controls. Markets 10236 such as suppliers, supply chains, distributors, affiliated vendors, and other businesses participate in conceiving, creating, developing, manufacturing, distributing, transporting, selling, supporting, servicing, etc. or other CorporatISM business activities.

Self-controls 10240: A CorporatISM controls the "plans", "packages", devices, services, products, etc. sold and owns the customer contracts under which those are sold, delivered and supported. As a result, the main type of customer control 10241 is to choose between the various offerings the CorporatISM chooses to sell, and based on each purchase contract signed, switch plans or vendors when the purchase contract permits that to happen. In each nation or state there may also be local government laws or regulations 10242 that provide various types of customer rights and/or protections; these may be expanded or extended at customers' requests where the local government is not under the influence or owned by large economic organizations such as the CorporatISM.

Customers 10246: User profiles are controlled by the CorporatISM 10247, and the main type of customer control is to choose between the various offerings the CorporatISM chooses to sell, and based upon each purchase contracts signed, switch plans or vendors when the purchase contract permits that to happen. Similarly, local policies 10248 are controlled by each CorporatISM or by each vendor affiliated with it, with the main customer goal being to capture and "own" sizable market segments that can be operated as business annuities that provide large monthly subscription revenues at sizable margins. Similarly, the "commercial packages" sold by each CorporatISM 10249 are controlled and decided by that CorporatISM, and include bundles of devices, services, targeted goals and rates of success, etc. If a CorporatISM chooses it may offer or include non-commercial features 10250 such as "public" services normally provided by government such as lifetime education (in some examples lifelong continuous education delivered as AK with follow-up services, designed to fit each individual's needs by integrating it during or after AKI interactions), roads, higher-quality water, etc.

Technology 10252: Technology 10252 10253 includes the AKM and the CorporatISM's use of the AKM and its reporting, the CorporatISM's business systems, and other uses of computing, communications, etc. for its operations and management: One technology option is for outsourcing to provide AKM services and business systems. Another technology option is for the CorporatISM to provide these. A third technology option is a hybrid that includes both outsourcing and local IT. Regardless of how AKM, business systems and technology uses are provided, technology includes: Communications 10254 including devices, AIDs/AODs, accessibility, security, etc. to provide AKM/AKI/AK and other interactive communications whether real-time interactions (synchronous) and/or store-and-forward (asynchronous) forms of communication. Scope determination 10255 including users, triggers, thresholds, actions (such as Direct AKI), etc. Technology rules and policies 10256 which includes governance issues that, in a CorporatISM, might include the options that can be designed and controlled by each CorporatISM (such as described in FIGS. 243 through 247 and elsewhere).

Business and finance 10258: These include components and business relationships that are authorized by management 10233 as well as those that are unauthorized (which are independent and may or may not be acceptable), some of which are comprised by: Components may include devices, products, services, equipment, systems, etc. 10259. Suppliers may include vendors, outsourcers, etc. 10260 who provide components, services, systems, etc. Partners 10262 may include corporations, non-profits, charities, schools, governments, other governances, etc. Sponsors and affiliates 10261 may include advertisers, sponsors, partners, allies, etc. which may be direct relationships, network-based, supply chain-based, distribution and sales chain-based, etc.

External communications 10265: External communications 10265 may mean integrated operations, technologies, business systems, etc. with other governances, companies, NGOs, institutions, governments, etc. that are outside this ISM.

WORLDISM—CENTRALIZED WORLDWIDE GOVERNANCE(S)—("GOV" 3 OF MANY): FIG. 250 "WorldISM—Centralized Governance Worldwide ("Governance 3 of many)" illustrates the expansion of centralized governance to produce greater human success across national boundaries by a single organization(s) that operates across national borders by means of technologies such as the AKM, without needing to be a political entity or government. A WorldISM Governance does not need to be based on a political philosophy (such as democracy, socialism, communism, etc.), an economic system or organizations (such as capitalistism, corporations, charity, NGOs, etc.) or a philosophy or set of goals (such as a group's values, beliefs, religion, aspirations, dreams, etc.). The purpose of a WorldISM is to collect and deliver larger ranges of devices, products, services, communications, filters, etc., perhaps including rules and private "laws", to guide its members lives, in some examples by entire families for decades as children are educated, enter and pursue careers, get married and raise children, and retire. In this case a WorldISM may sell and deliver a more or less complete or wrap-around bundle(s) of the goods and services needed to achieve and receive "focused" lives and/or standards, (optionally) including filters to screen out portions of the larger culture that are not wanted. As illustrated herein a WorldISM 10266 FIG. 250 has a plurality of sub-components including: Central visible results 10295 from ISM-wide reporting 10296; Administration 10268; Self-controls 10273; Membership 10278; Technology 10284; Business and finance 10290; External communications 10297.

It is the new combination of WorldISM governance components, to achieve new benefits, that is part of what is disclosed. The components that are disclosed and combined herein to produce some examples of a governance include:

Central visible results 10295 from WorldISM-wide reporting 10296 (whether one or more WorldISM's): Data from each area flows to central reporting 10295 10296 which provides current and historical information (such as reporting and dashboards as described elsewhere) so that this governance's performance is clear to its administrators 10268, members 10278 10273, employees who run or work in its systems 10284 and operations 10290, as well as those who work with this governance from the outside of it 10297. In some examples while complete detailed reporting is optional, some of the areas reported may include that WorldISM's goals or mission, measured results, gap analyses between goals and results, etc., where those are reported in aggregate for the whole WorldISM, for major subgroups, and for each operations center or operating group such as geographic region (such as a country, state or metropolitan area), demographic group (such as by age, gender, income, ethnicity, affiliation [such as religion]), device, service, "plan", business system, vendor, outsourcer, partner, or any other reporting group that is appropriate to understand the WorldISM's results relative to its goals or mission. By means of this area's visible results 10296 a WorldISM, its administrators, employees and members are able to produce and achieve continuous improvements such as by processes illustrated.

Administration 10268: A WorldISM may or may not be Democratic so multiple options are available 10272 including an elected head of governance, a "dictator", an inherited position, etc., with a pointed "managers," administrators, etc.; if there are representatives 10272 they may be selected in the same or different way as the main administrator (e.g., elected, appointed, inherited, etc.). Regardless of the management model 10272, administration may be as tightly coupled or as loosely coupled as desired in each business, regulatory or policy area; and include: Management of business functions 10269 and/or operating units which can be managed by any known means such as those used by global organizations (like the United Nations, World Bank, etc.), global corporations, or other management models. Regulation and administration 10270 may be done by any means that fit the culture of the WorldISM which may be more businesslike, democratic, bureaucratic, dictatorial, etc. Market policy 10271 may be set and administered to fit the WorldISM's requirements in areas such as sales (of plans, "programs," products, services, etc.), vendors, alliances, business deals, partnerships, mergers, vendor "programs", etc.

Self-controls 10273: If permitted, individual members or various groups in a WorldISM may identify, recruit and recommend candidates for governance positions 10274 in the WorldISM, including roles such as chief administrator, managers, administrators, regulators, etc. Democracy is one option for the self-governance of a WorldISM 10275; and if used as employed in different "democratic" countries this may include real or rigged elections, ballot initiatives, genuine opportunities to vote changes in the WorldISM's form(s) of self-governance, etc.

Membership 10278: Even though a WorldISM controls the "plans", "packages", devices, services, products, etc. sold, and owns the customer contracts under which those are sold, delivered and supported; and even though a WorldISM may determine each customer's freedom of choice (which may be at one end of the scale in an IndividualISM) or lock-down (which may be at the opposite end of the scale in a severe CorporatISM)—however, a WorldISM's potential members may choose between multiple options to achieve their lifetime goals, and in addition to normal life "paths" such as college and career and family, with or without AKM assistance, their choices might include multiple WorldISMs, CorporatISMS, IndividualISMS and/or other governance options for collective assistance with their life's goals, so that freedom of choice prevents a single WorldISM from having unlimited control over its members. User profiles 10279 are therefore flexible and can be determined by each WorldISM, but are likely to be controlled by a varying blend between a WorldISM, its members, vendors who provide its products and services, etc.; the means are likely to be a combination of self-service (as described elsewhere), pre-configured sample profiles to select, AK provided to show how to configure or update a profile to achieve a goal(s) or objective(s), various types of assistance, etc. Similarly, local policies 10280 are flexible and likely to be controlled by local groups (which may be virtual/dispersed, or located in one geographic area) that include a flexible blend between a WorldISM, its members, vendors who provide its products and services, etc.; the means are likely to be means for group decision-making plus a central authority responsible for configuration or updating the group's policies that, in turn, affect the profile(s) of two or more members of the group. Similarly, the "commercial packages" of each WorldISM 10281 are controlled and decided by that WorldISM, and include bundles of devices, services, targeted goals and rates of success, etc. If a WorldISM chooses it may offer or include non-commercial features 10282 such as "public" services normally provided by government such as lifetime education (in some examples lifelong continuous education delivered with AKI as AK links with follow-up services, designed to fit each individual's needs by integrating it during or after their AKI interactions), roads, higher-quality water, etc.

Technology 10284: Technology 10284 10285 includes the AKM and the WorldISM's use of the AKM and its reporting, the WorldISM's business systems, and other uses of computing, communications, etc. for its operations and management: One technology option is for outsourcing to provide AKM services and business systems. Another technology option is for the WorldISM to provide these. A third technology option is a hybrid that includes both outsourcing and local IT. Regardless of how AKM, business systems and technology uses are provided, technology includes: Communications 10286 including devices, AIDs/AODs, accessibility, security, etc. to provide AKM/AKI/AK and other interactive communications whether real-time interactions (synchronous) and/or store-and-forward (asynchronous) forms of communication. Scope determination 10287 including users, triggers, thresholds, actions (such as Direct AKI), etc. Technology rules and policies 10288 which includes governance issues that, in a WorldISM, might include the options that can be designed and controlled by each WorldISM, member, vendors, and others (such as described in FIGS. 243 through 247 and elsewhere).

Business and finance 10290: These include components and business relationships that are authorized by management 10268 as well as those that are unauthorized (which are independent and may or may not be acceptable), some of which are comprised by: Components may include devices, products, services, equipment, systems, etc. 10291. Suppliers may include vendors, outsourcers, etc. 10292 who provide components, services, systems, etc. Partners 10294 may include corporations, non-profits, charities, schools, governments, other governances, etc. Sponsors and affiliates 10293 may include advertisers, sponsors, partners, allies, etc. which may be direct relationships, network-based, supply chain-based, distribution and sales chain-based, etc.

External communications 10297: External communications 10297 may mean integrated operations, technologies, business systems, etc. with other governances, companies, institutions, governments, etc. that are outside of this ISM.

GOVERNANCES REVENUES SYSTEM (GRS)—ECONOMIC INTEGRATION: Monetary systems have a long history with numerous inventions and transformations. In one example, during the 18th century the monetary system was replaced—the use of coins made out of precious metals (specie) could not keep up with the demand for money, and that era's money system held back economic growth during the early industrial revolution. It was impossible, for example, to finance and build large new factories, railroads and mills using only the small available supply of gold coins. John Law, a Scotsman, is credited with inventing paper money backed by precious metal reserves, called the Fractional Reserve System. In it, banknotes (initially issued by banks) were recognized officially as "real money," and banks were required to keep a fraction of their issued notes in the form of specie (precious metals), and it was gradually determined that $100 of paper money could be supported by holding $10 in gold in reserve. As a result, private banks were chartered by the government to create a new supply of paper notes, but in time the federal government took the job of printing paper money. In the 1930s paper money stopped being convertible into specie, producing the paper money system in use today.

As governances evolve and perform one or a plurality of functions and services, revenues are required in order to support operations and growth. In addition to known sources of revenues for organizations and institutions (which may utilize any legal form of business, commerce, real estate, banking, or any other form of legal enterprise, investment or ownership), a new adaptation of electronic monetary systems can provide financial revenues for governances. In the same way that nation-states have evolved tax collection into an organized system such as the IRS (Internal Revenue Service), FIG. 251, "GRS—Governances Revenues System (Economic Integration)," illustrates some examples in which a variety of types of electronic monetary payments may be employed to provide revenues to one or a plurality of governances. Said electronic monetary payments in some examples include credit cards, in some examples include charge cards, in some examples include debit cards, in some examples include automated monthly billing and payments, in some examples include online banking, and in some examples include any other form of electronic payments (collectively herein referred to as e-payments, which collectively include a plurality of uses of the electronic monetary system).

FIG. 251, "Governances Revenue System (Economic Integration)": In some examples a GRS (Governances Revenue System) utilizes a variety of types of electronic payments a user (or identity) can make e-payments that include a variable percentage of electronic transactions to be made to one or a plurality of governances. In some examples electronic transactions utilize a government currency (money); in some examples virtual currency; in some examples virtual credits; in some examples tradable exchange credits and or currency accepted for payment by a plurality of different payees; in some examples other forms of virtual currency, credits or tradable exchange credits. In some examples the variable portion of an electronic payment paid to one or a plurality of governances is called the GRS rate. In some examples the GRS rate is a percentage of a transaction (such as in some examples one-fourth of 1% [0.25%], and in some examples 3%); in some examples the GRS rate payment can be deducted from the total transaction (such as in some examples with a 1% GRS rate, 99% of an electronic transaction is paid to the payment processor and the payee, while 1% is paid to the governance); in some examples the GRS rate payment can be added to the total transaction (such as in some examples with a combined total 3% GRS rate, 100% of electronic transaction is paid to the payment processor and the payee, while an additional 3% is paid to one or a plurality of governances); in some examples part of a GRS rate can be deducted from the total transaction while the remainder of a GRS rate can be added to the total transaction amount.

In some examples an allocation component of a GRS enables a user, identity, governance and/or authorized third-party to add, allocate or combine GRS rates and/or automated payments to one or a plurality of governances; in some examples to add, allocate or combine the categories and/or subcategories of transactions for which each governance receives GRS rate payments; and in some examples a plurality of governances GRS rate payments may be visually displayed together (with or without transaction categories) for editing to provide a different allocation, prioritization, categorization, or other edits to a user's GRS payments to one or a plurality of governances. In some examples said edited allocation may be employed when transaction categories overlap (such as in some examples food transactions for any user who is a member of a plurality of governances that receive revenues from food transactions such as in some examples a weight-loss governance, in some examples a fitness governance, in some examples an environmental governance, in some examples an organic food growing governance, and in some examples other governances with an eating or a food production component).

In some examples one or a plurality of payment processing systems automatically receives and processes a payment transaction such as in some examples receiving the e-payment transaction data; in some examples to retrieve the current GRS rate allocation for that payer's transaction category; in some examples analyzing the transaction to determine whether that payer and transaction category require payment to one or a plurality of governances; in some examples to calculate the payment due to one or a plurality of governances; in some examples to determine if funds are available to make the payment(s); in some examples to contact the payer if there are insufficient payment funds; in some examples to execute said governance payment(s); and in some examples to enter governance payments data into the respective accounts at one or a plurality of paid governances and/or into the payer's appropriate payment account(s). In some examples a GRS includes a review system whereby a user, identity, governance and/or authorized third-party can review the user's accounts at one or a plurality of governances, at various levels of detail; in some examples to retrieve and review said user's governances payments allocation and compare that to actual amounts paid to one or a plurality of governances; in some examples to edit the overall governances allocations, in some examples to edit a governance's GRS rate, in some examples to edit overlapping transaction categories, in some examples to change the source of payment for one or a plurality of governances, or in some examples to edit another component of said user's GRS configuration. In some examples an authorized governance and/or authorized third-party may retrieve, edit, update, and perform other group or simultaneous operations on the accounts of a plurality of users. In some examples components of a GRS may be distributed so that they are located remotely from each other with each component's steps performed separately and communicated through one or a plurality of networks. In some examples a GRS may take various forms and be provided by one or a plurality of sources.

Turning now to FIG. 251, "Governances Revenue System (Economic Integration)," some examples are illustrated of means to make it easy for a user (or identity) to make e-payments that include a variable portion of the e-payment to be made to one or a plurality of governances as a normal and relatively invisible part of making e-payments. In some examples an object is to allow a user to make various types of electronic payments that automatically includes paying a variable portion of a transaction to one or a plurality of governances. In some examples an object is to enable providers of e-payments, electronic monetary systems, virtual monetary systems, and/or electronic payments processors to provide an easy way to pay varying portions of electronic transactions to governances. In some examples electronic transactions may utilize a government currency; and in some examples electronic transactions may utilize a virtual currency, such as in some examples a currency issued in a virtual game, in some examples a virtual currency issued in a virtual world, in some examples credits or a currency issued on a specialized website such as a social networking site that issues credits or a currency, in some examples a tradable exchange credit and/or tradable exchange currency that is accepted for payment by a plurality of games or websites, or in some examples other forms of virtual currency or credits.

In some examples a variable portion of an e-payment that is paid to one or a plurality of governances can be a fraction of 1% of a transaction, such as for one example one fourth of 1% (0.25%); in some examples a variable portion of an e-payment that, is paid to one or a plurality of governances can be several percent of a transaction, such as for one example 3%; and in some examples of variable portion of an e-payment that is paid to one or a plurality of governances can be 10% or more of a transaction, such as for one example 12%. In some examples the variable portions of an e-payment that are paid to one or a plurality of governances can be a combination of percentages such as for one example a total 8% of an appropriate transaction can be a combination of 1% to an environmental governance, 2% to an energy usage/energy saving governance, and 5% to a high-quality lifestyle provider governance.

In some examples an identity's contract with a governance determines how to handle a variable portion(s) of an e-payment that is paid to one or a plurality of governances (herein the variable portion of an e-payment it is paid to one or a plurality of governances is called the GRS rate). Said GRS rate for each governance is usually set by contractual means such as a membership agreement between an identity and a specific governance, a participation contract between an identity and a specific governance, a service contract between an identity and a governance, a shareholder agreement (such as in some examples for partial ownership) between an identity and a governance, or another type of relationship between each individual and each governance; which in some examples provides for a single governance to have multiple categories of relationships or types of relationships with different individuals. In some examples the GRS rate can be deducted from the total amount of a transaction as a transaction cost, such as for one example a 1% GRS rate is deducted and paid to one or a plurality of governances while the remaining 99% of that e-payment transaction is utilized to pay for processing and the revenue received by the payee. In some examples the GRS rate can be added to the total amount of a transaction as an additional cost to the payor, such as for one example 10% GRS rate is added and paid to one or a plurality of governances while 100% of that e-payment transaction is utilized to pay for processing and the revenue received by the payee. In some examples the GRS rate is divided between a deduction from the total amount of a transaction as a transaction cost and an additional percentage added to the total amount of transaction as an additional cost to the payor, such as for one example a 6% GRS rate is divided into two parts with 1% of that 6% GRS rate deducted and paid to one or a plurality of governances, and 5% of that 6% GRS rate added and paid to one or a plurality of governances, while 99% of that e-payment transaction is utilized to pay for processing and the revenue received by the payee.

In some examples an object of a GRS is to provide means for an identity 2707 to initiate or edit a portion(s) of specified categories of e-payments to provide revenues to one or a plurality of governances. In some examples these objects can be reached by adding means for an authorized governance 2715 (or an authorized third-party, as described elsewhere) to add 2708 or edit 2708 a GRS payment (that is, the portion[s] of a specific identity's specified governances 2709 2710 and GRS rates to provide revenues to one or a plurality of governances). In some examples these objects can be reached by adding an intercepting means to an identity's and/or an authorized governance's previously specified categories of e-payments processing 2721, whereby the previously specified portion(s) of said e-payments 2709 2710 are redirected to one or a plurality of governances. In some examples these objects can be reached by storing the amounts that an identity pays to one or a plurality of governances in one or a plurality of accounting systems 2732, so that the amounts paid to a governance(s) may be retrieved and displayed 2733 in some examples to a request from an identity 2729, in some examples to a request from a governance 2729, or in some examples to a request from another authorized requestor.

Therefore, in some examples a GRS is characterized by an e-payments interception means that is managed in some examples by identities, in some examples by governances, in some examples by an authorized third-party, and in some examples by a combination of identities and governances and authorized third-parties; and which in some examples is designed to redirect previously specified portions of previously specified categories of e-payment transactions to governances in the form of revenues that are accounted for as individual payments from individually identified users (identities); where in some examples those identities' individual governance(s) payment accounts may be reviewed and said previously specified portions of previously specified categories may be edited. In some examples governance e-payments processing includes an interception means that examines each transaction in some examples for the identity(ies), in some examples for the transaction category, and in some examples for other attributes; in some examples utilizes said he examined attributes (such as identity, transaction category, etc.) to retrieve the pre-specified portion(s) to be paid to one or a plurality of governances, determines the amount(s) to be paid to the governance(s) from that transaction; and in some examples transmits said payment(s) to said governance(s). In some examples this is designed to make it simple and easy for individuals to make payments to governances as a normal part of e-payments for one or a plurality of types of e-payment transactions.

In some examples a GRS (Governances Revenue System) comprises input/output/control devices 2701 2702 2703, one or a plurality of disparate networks 2700, user systems and controls 2706 to allocate governance e-payments, governance systems for processing e-payments 2720, systems for reviewing governance payments 2728, and storage for each user's (or identity's) settings 2716. In some examples this is accomplished by means for using a GRS 2706 such as in some examples one or a plurality of source(s) is provided by an LTP 2702, in some examples one or a plurality of source(s) is provided by an MTP 2702, in some examples one or a plurality of source(s) is provided by a subsidiary device 2701, in some examples one or a plurality of source(s) is provided by an AID/AOD 2703, and in some examples one or a plurality of source(s) is provided by another type of networked electronic device. In some examples said devices 2701 2702 2703 are connected by one or a plurality of disparate networks 2700.

In some examples an allocation component of a GRS 2706 includes means for an identity 2707 to login to a GRS allocation system for the purpose of initiating, editing and/or allocating varying portions of e-payments to one or a plurality of governances. In some examples a user component of a GRS 2706 includes means for an authorized governance 2715, or in some examples an authorized third-party, to login to a GRS allocation system for the purpose of initiating, editing and/or allocating varying portions of e-payments to one or a plurality of governances. In some examples a logged in identity 2707 or governance 2715 (herein collectively referred to as "user") can add a governance 2708 such as when an identity joins a governance (as described elsewhere); and in some examples said user 2707 2715 logs in to the new governance 2712. In some examples the new governance does not have e-payments categories that overlap other governances 2713, in which case that governance receives 100% of that governance's transaction categories (based on its GRS rate) that are made with e-payments.

In some examples the new governance has e-payments categories that overlap other governances 2713, in which case said identity's governances membership table 2709 is retrieved and used to edit the table 2710 such as in some examples to specify and/or confirm the GRS rate for each governance, and in some examples to specify and/or confirm whether the GRS amount is added to the transaction amount or not. For one example a WorldISM environmental governance may include categories for products with environmental impact such as energy, food, water, products made from plastic, etc. and in some examples all purchases in all of that governance's categories may have one GRS rate 2710, and in some examples each of these categories may have a different GRS rate 2710 depending on various factors such as on the severity of each category's environmental impact. For another example an identity may be a member of several overlapping governances such as a simultaneous plurality of governances that are concerned with food purchases—which in some examples may be a WorldISM environmental governance, in some examples may be an IndividualISM weight loss governance, and in some examples may be an IndividualISM fitness governance; and in some examples the user may have the contractual right to adjust the percentage allocation of food purchase payments between these overlapping governances (such that the total payment is required to be made from each transaction, but the user has the right to allocate the relative amount paid to each governance 2709 2710 based upon their personal judgment of which is most important to them). For variation of this same example, the overlapping governances may have other means for adjusting their overlapping allocation of the revenues from an identity's overlapping e-payment; in this example case one or a plurality of governances logs in 2715, edits 2708 and retrieves the identity's governances data 2709, edits it appropriately 2710, and saves it 2711. For another example an identity may be automatically made a member of one or a plurality of governances by the identity's membership, subscription, employment, or other relationship with an organization, and in this case the identity's membership agreement (or employment agreement, or subscription agreement, etc.) may automatically assign permission for those one or plurality of governances to manually and/or automatically login 2715, add 2708, edit 2708, allocate 2713 2709 2710, and save said identity's governances allocation table and/or data 2711 2716.

In some examples after said user 2707 or governance 2715 completes retrieving the identity's governance allocations 2709 2714 and editing them 2710, the identity's allocation is automatically saved 2711 2716, and in some examples it is manually saved 2711 2716. In some examples said additions (whether by users 2707 or by governances 2715) of one or a plurality of governances, and/or edits of governance(s) allocations may be performed in some examples manually and in some examples performed automatically under program control; in some examples a user 2707 or governance 2715 may manually associate particular overlapping payments with particular governances such as in some examples by using a website 2709 2710, in some examples by editing a table in a computer application 2709 2710, in some examples by verbally instructing a governance(s) representative(s) in a telephone call so that the representative may make a computer adjustment of the payment allocation 2709 2710, in some examples by other known means 2709 2710. In some examples after a governance has been added and saved 2711 2716, or overlapping governance payments have been edited and saved 2711 2716, subsequent governance payments processing 2720 proceeds as if the payments processing system had been programmed to perform according to the saved addition and or allocation edits 2711 2716.

In some examples a GRS includes a payment processing system that automatically receives and processes e-payment transactions for particular types of e-payments (as described elsewhere). In some examples a payment processing component of a GRS 2720 includes means for receiving e-payments transactions 2721 that includes the obligation to make a governance payment 2721 by a user 2706 or an identity 2706; in some examples it includes analyzing the transaction to determine whether one or a plurality of governance payments is due and may be made automatically 2721, and where governance payments are not due 2721 terminating any and all governance payments processing. In some examples if said governance payment(s) is due and may be made automatically (or substantially automated) then it retrieves said identity's governances allocation table 2722 2716, or it retrieves said identity's governances payments data 2722 2716; in some examples a system determines 2721 2722 that the e-payment transaction qualifies for automated governance payment (e.g., the transaction satisfies a pre-defined criteria as described elsewhere) the system advances to calculate one or a plurality of governance payments 2723 2724 2725, determine if the funds are available to make the payment(s) 2726, and execute said governance payment(s) 2727. In some examples the system utilizes said retrieved data 2722 2716 to determine if the payment is due to one or a plurality of governances 2723, and it does this by determining whether the transaction data meets one or a plurality of pre-defined sets of automated governances payments criteria (such as for one example that the transaction category fits a transaction category for one or a plurality of that identity's governances).

In some examples the system determines the amount to be paid to one or a plurality of governances; if a payment is due to only one governance 2723, then it utilizes said retrieved governances allocation table 2722 2716 or governances payments data 2722 2716 to calculate the payment to one governance 2724, determine if the payment may be made 2726, and make that payment 2726; and in some examples if the payment is due to a plurality of governances 2723, then it utilizes said retrieved governances allocation table 2722 2716 or governances payments data 2722 2716 to calculate the payment to a plurality of governances 2725, determine if the payment may be made 2726, and make that payment 2727.

In some examples governance processing 2720 may be performed by a single system such as in some examples a bank credit card processing system; in some examples governance processing 2720 may be performed by two or a plurality of "authorized third-party" systems such as in some examples a bank credit card processing system 2721 combined with one or a plurality of additional systems such as in some examples a separate system for retrieving an identity's governances payments data 2722, in some examples a separate system for calculating the appropriate governance(s) payment(s) due 2723 2724 2725, in some examples a separate system for determining if a payment may be made 2726, in some examples a separate system for receiving the governance(s) payment(s) due data and making the governance(s) payment(s) 2727; in some examples these various systems may be combined or separated in various combinations and provided by two or a plurality of remotely located third parties with the appropriate data communicated over one or a plurality of disparate networks 2700.

In some examples a payment to multiple overlapping governances 2723 2725 requires additional substantiation by one or a plurality of governances 2706 2715, and in such a case one or a plurality of governances may be requested to submit additional substantiating materials; and in some examples a payment to multiple overlapping governances 2723 2725 requires additional substantiation by an identity 2706 2707, and in such a case an identity may be requested to submit additional substantiating materials; in either case, said request(s) and reply(ies) may be either manual or automated; and in either case, said instantiation and resolution may be saved for future automatic retrieval and use in making said calculation to multiple overlapping governances 2723 2725. In some examples an identity and/or a governance may be notified in one or a plurality of ways that additional substantiation is needed, and in that case notification may occur in various ways (such as in some examples by an e-mail, in some examples by a personal message posted in a personal inbox on a website, in some examples by an automated telephone call, in some examples by a printed letter, in some examples by a printed message on the next subsequent monthly statement, in some examples by an automated notification under program control to a governance's system, and in some examples by other known means). In some examples the identity and/or governance can then submit the substantiation (in response to said notification) electronically; in some examples said substantiation can be provided as printed materials; in some examples said substantiation can be provided in a phone call; in some examples said substantiation can be provided via a website; and in some examples said substantiation can be provided via other known means.

In some examples one or a plurality of payments to one or a plurality of governances 2724 2725 may exceed the identity's account balance or available credit; that is, if an additional sum must be paid the system determines if the funding source has available funds or credit 2726 (such as in some examples by requesting this information from the appropriate financial institution or credit card's sponsor bank) and in some examples a payment account has less funds than the payment[s] due 2726, and in some examples a credit card[s] available credit is less than the payment[s] due 2726, and/or the payment account's available funds are less than the payment[s] due 2726, and in such a case an identity may be contacted to make alternate payment arrangements or to cancel the transaction. In some examples the combined available funds from one or a plurality of accounts 2726, and one or a plurality of available credit sources 2726 may be combined to make the required payment(s) to one or a plurality of governances. If the system determines that the one or a plurality of governances can be paid from the available funds or credit 2726 it proceeds to execute the payment to the one or plurality of governances 2727; in some examples said payment(s) may be made automatically from the identity's available financial accounts 2726; in some examples said payment(s) may be made automatically from the identity's available credit 2726; and in some examples said payment(s) may be made automatically from a combination of the identity's available financial accounts 2726 and available credit 2726.

In some examples making a payment(s) to a governance(s) 2727 enables automated payment receipt 2727 and entry of that identity's payment 2731 in the appropriate account(s) at each governance paid 2732, and/or at the payer's payment account(s). In some examples payment 2727 and receipt 2727 may be made by any known means employed in e-payments transaction processing. In some examples payment 2727 and receipt 2727 may be made by sending payment information 2727 from a third-party GRS processing system to an identity's financial account's institution, credit card sponsor bank, or other credit account's institution (herein called the "payment source"); as well as sending payment receipt information to a governance 2727; whereupon the payment source sends a monetary file to a governance 2727 to update both the governance's financial account balance(s) and that identity's account balance(s) 2731 in the governance's accounting system 2732.

In some examples a GRS includes a review system 2728 such that in some examples a user 2729, in some examples an identity 2729, in some examples a governance 2729, or in some examples an authorized third-party (herein collectively referred to as "user") can login to review the current accounts, previous account(s) history(ies), and their status at one or a plurality of governances 2728. In some examples said review system 2728 includes logging in to display all of an identity's governance accounts by retrieving said identity's governance (s) accounts data 2730 2716 and governance(s) allocation table 2730 2716, which then automatically retrieves that identity's governance(s) account(s) data 2723 (such as in some examples by automated login and retrieval of that identity's account data in each respective governance accounting system 2732 for a consolidated review). In some examples said review system 2728 provides means to display an identity's governance account balances 2733 at one governance by logging in 2729, retrieving said identity's governance(s) accounts data 2730 2716, and then manually selecting the retrieval of one governance's account data 2733; in some examples that is performed by automated login and retrieval of that governance's account data 2732, while in some examples that is performed by manual login and viewing of that governance's account data 2732 on that governance's website or service.

In some examples a user can utilize said display to view in some examples one or a plurality of governance account balances 2733; in some examples a user can utilize said display to view account summaries for a specific time period 2733 (such as in some examples an account history for the most recent month, in some examples for a selected month in the past, or in some examples for a selected year or year-to-date); in some examples a user can utilize said display to view detailed transactions listings 2733 (such as in some examples by date, in some examples by category, in some examples by vendor, in some examples by another attribute); in some examples a user can utilize said display to view payments focused data such as by each funding source used to make governance payments 2733 (such as in some examples a summary history showing one total for each of the payment sources, and in some examples detailed lists of transactions paid by each funding source); in some examples a user can utilize said display to view pending e-payment transactions 2733 that have been made but have not yet been processed 2720 or paid 2727 to one or a plurality of governance accounts; in some examples a user can utilize said display to view pending e-payment transactions 2733 that have been made but for which there are insufficient funds 2726 to make payment(s) to one or a plurality of governances 2727. In some examples a GRS further allows a logged in user 2707 2729 to make online payments 2727 directly to one or a plurality of governances; whereupon said payment(s) is received 2727, entered into said user's account(s) 2731, and said account(s) is updated with the online payment(s) 2732.

In some examples an authorized user such as in some examples a governance 2729, in some examples a third-party e-payments processor 2720 2729, or in some examples another authorized user 2729 can utilize a search interface to view account information for one or a plurality of identities at one or a plurality of governances 2733 such as in some examples account balances 2733, in some examples summaries 2733, in some examples pending payments 2733, in some examples insufficient funds payments 2733, in some examples overdue payments 2733, in some examples payments by category(ies) 2733, in some examples payments by date 2733, in some examples payments by location 2733 (such as country, region, state, city, etc.), in some examples combinations of attributes 2733 (such as insufficient funds payments by state during the most recent month), in some examples other types of searches. In some examples a search for a plurality of identities may include a governance's members who share a common attribute such as membership in a group where membership in that governance is a universal or an available benefit (such as in some examples employees of a company, in some examples members of an organization or association, in some examples of affiliates in a business system, in some examples other types of associations); or share a different common attribute (such as in some examples having joined within a date range such as the last quarter, having two or more insufficient funds payments, or in some examples any other common attribute). In some examples said searches produce unranked lists of search results data 2733; in some searches said searches produce sorted data 2733 whose default sort may be user settable attribute(s) such as date, amount, identity, location, vendor, category of purchase, or another one or a plurality of attributes; in some examples said lists of search results data 2733 may be sortable on-demand by one or a plurality of attributes.

In some examples a logged in user 2729 who has displayed data 2733 whether by retrieval 2733, by search 2733, or by another known means 2733 can choose to edit governances 2734 2708 (as described elsewhere) such as in some examples to change governance allocations 2713 2709 2710 2711, in some examples to update a particular governance's data 2712 such as updating one's identity data at that governance, or in some examples to perform another type of edit. In some examples edits 2734 2708 provide means for some users (such as the identity 2707 only) to reassign the funding sources used to pay particular categories of transactions at particular governances 2709 (such as in some examples if governance payments processing currently associates a governance payments source 2727 as the same source of payment utilized to make each transaction [whether a transaction is paid by a bank account, a credit card, a credit account, or by any other source] the user may reassociate the governance payment with a different and specific source such as making all governance payments from a single credit card that may [optionally] be used only for making all of an identity's governance payments).

In some examples parts of a GRS's system, transactions, processing or functionality may be distributed such that various functions (such as in some examples users allocating governance payments 2706, in some examples governance processing 2720, in some examples analyzing e-payments for governance payment obligations 2721, in some examples calculating governance payments 2722 2723 2724 2725, in some examples determining if the funds or credits are available to make a payment 2726, in some examples making payments to governances 2727, in some examples reviewing governance payments 2728, in some examples storing each user's [or identity's] settings 2716, and in some examples other features or functions) are co-located or are located in separate and remote devices, servers, applications, storage, etc. so that various steps are performed separately and are communicated through networks 2700; in some examples the equivalent of a GRS may be provided by means other than exemplified herein and provided over said network(s) 2700.

In some examples a GRS may take the form of an entirely hardware embodiment that is located in one or a plurality of locations and provided by one or a plurality of vendors; in some examples a GRS system may take the form of an entirely software embodiment that is located in one or a plurality of locations and provided by one or a plurality of vendors; or om some examples a GRS system may take the form of a combination of hardware and software that is located in one or a plurality of locations and provided by one or a plurality of vendors and/or payment processors. In some examples a GRS system may take the form of a computer program product (e.g., an unmodifiable or customizable computer software product) on a computer-readable storage medium. In some examples a GRS system may take the form of a web-implemented software product and/or service (including in some examples a Web service accessible by means of an API for utilization by other applications and/or services). In some examples local and/or network accessible remote storage may be provided by any computer readable storage medium such as hard disks, optical storage, DVD's, magnetic storage, etc.

DIGITAL FREEDOM FROM DICTATORSHIPS SYSTEM: Many millions around the world live lives of silent desperation under dictatorial governments that will not hesitate to punish them, to imprison them, even to kill them. Their living standards are typically suppressed to a low level because a modern economy and prosperous living standards thrive on what these peoples are denied—education for both women and men, creativity and thinking in new ways. Their lives are locked down and when they complain they are terrorized by dictatorial governments that want their obedience and not their energies, their accomplishments or their dreams. Terrorists feed on these oppressions, demonizing prosperous advanced economies for these peoples' conditions, recruiting oppressed children as soldiers in growing a cultural war between the haves and the have-nots.

Many millions of others live under free governments with lives of outspoken aspiration, but their rational beliefs that freedom is a human right and everyone should share it are ignored by their powerful democratic governments when the subject turns to transforming dictatorial governments and liberating their peoples. Though free, the citizens of societies with advanced economies are often ignored when their aspirations turn to democratic freedoms in dictatorial countries, and if they complain they are often urged to spend their efforts in ways that will not change those governments.

Today this situation appears intractable. Within their own lives people everywhere have daily pressures whether they live in a prosperous society or a poor one. From outside their lives all are constantly confronted by new head-turning events like the latest political confrontations, international crises, terrorist threats, repeated energy problems, economic instabilities and many other media-hyped issues (because media earns more when it captures its audiences' attention). The central problem of human freedom from dictatorships is marginalized, without meaningful ways to achieve it, even discuss it, even hope to change it.

That may no longer be the whole story. One contention of an ARTPM is that if we don't like physical reality there might be new digital ways to change it. It implies that a new possibility in the future might become, "If you want a better reality, change it."

If there were new means to make changes, would individuals living under some dictatorships use stealthy and cloaked means to change their lives in ways that are impossible today? If yes, might the most significant question become how to release human energies so a growing number of oppressed people can use new means to produce the outcomes that each one desires, to which a growing number of oppressed people might be willing to commit at least some effort? If yes, might the next question become how big a difference can individual efforts make—might they allow us to ask whether dedicated and free stealthy individuals could change their societies? If true, this may make it easier to see that changing your digital reality might gradually change a dictatorial society, and not just your personal life.

These new means are a digital version of what is named here as the "CHC model," which has been pioneered and proven by major global corporations who have moved huge amounts of money to what is named here as "safe havens" (countries with low tax rates or no corporate taxes, which are typically called "tax havens"). Basically, Company X sets up a controlled holding company (CHC)—named here "CHC1"—in a tax haven. Company X sells CHC1 (its controlled holding company) its headquarters building with a provision to lease back its headquarters building. In many cases this is externally invisible because the lease payments made by Company X (which are Company X's costs) are received by its holding company, CHC1 (which are CHC1's revenues), so these payments and revenues cancel each other out. None of the employees who work in the headquarters building need to move their desk, and Company X controls both its holding company (CHC1) and its headquarters building, but now the ownership of the building and the (lease) payments for that asset are in the tax haven. The biggest change might be a new brass plaque in the building lobby that says "Owned by CHC1". From a shareholder viewpoint Company X delivers financial reports that include its holding companies so the payments and receipts between Company X and CHC1 (its controlled holding company) cancel each other out so they are reported without affecting the bottom line and shareholders receive an accurate financial picture of the entire enterprise.

In a further development of this CHC Model, Company X creates new products, trademarks, patents and services that it protects as its Intellectual Properties. Now Company X sells some of its valuable Intellectual Properties (IP) to its controlled holding company, CHC1. It then leases back its IP for the amount of profits that it earns from creating and selling products and services with those Intellectual Properties—which moves its profits from the countries where it does business to a holding company in a tax haven that is beyond the reach of the tax authorities where it does business. In a variation CHC1 charges a substantial royalty rate that parallels Company X's average or expected rate of profit for each type of IP, so this dynamically adjusts each year's payment to approximate its current year's sales, revenues, costs and profits. Since profits are variable and may be increased by moving manufacturing to a low wage country, profit-driven royalty payments may be dramatically increased over time. In another variation, Company X can declare CHC1 as the managing office for its overseas businesses so those overseas business profits stop at CHC1 and are not received (for tax purposes) in Company X's home country. From a single government's taxation viewpoint Company X does not earn taxable profits because it makes lease payments, royalty payments or other payments to CHC1, nor does it receive the profits from overseas businesses that are "managed" by CHC1—which is located in a tax haven.

As a result, it is natural for some multinational corporations to move costs to high-tax countries (like the United States) while moving profits to low-tax countries (like tax havens or countries with low tax rates). This is not illegal and it has been done out in the open in front of everyone, with detailed tax filings every year. Since this has been growing for decades major global corporations are now said to collectively own trillions of wealth and assets in tax havens (in private accounts so the actual amounts are not revealed), beyond the reach of governments and their tax authorities. As one obvious result that is frequently reported, the share of US taxes paid by corporations has fallen steadily for decades to historically low levels today—especially for corporations that own CHC's (controlled holding companies) in tax havens.

Currently, some estimate that tax havens have up to $6 trillion in total wealth stored in them, and the fortunes and prominence of corporations have never been higher—paralleled by the success of the related parts of some tax havens' economies. Those parts of a tax haven's economy are scalable because they do not consume local resources or need to hire local employees, they provide only minimal services for even tens of thousands of remote CHC's (controlled holding companies) while collecting some fees in return, and they rarely require CHC's to report income or assets. In turn, the CHC's have two main types of assets, their contractual paper-based ownership such as properties and IP, and their financial assets in bank accounts and brokerage accounts (often serviced by the world's leading accounting firms and financial management firms). To increase their value many CHC's use their considerable assets to pay for their parent company's creation of new IP—so they automatically own its new creations without needing to buy them, and can then receive the profits from those new IP throughout each of these new products' and services' life cycles while escaping all or most taxation. Corporations have sizable funds in CHC's that they cannot spend in their home country without huge financial costs, but they can deploy these funds anywhere else in the world, taking advantage of the best business opportunities everywhere without being subject to any one government's control. Since the value of IP is often not reported anywhere, this process is typically invisible and unreported.

As the ARTPM, Teleportals, SPLS's and new types of digital realities help people in many places enter the equivalent of a digital Earth that is one large connected room, it will become more common for people to have contacts, friendships, business relationships and incomes from around the world. For example, a local person with a Teleportal may do various types of work for a company in another country, and receive a pay check or other income as a result. Similarly, they may own property in another part of the world—or rent local property that is owned by a company located in a stable country like the United States.

The combination of the ARTPM and corporations' highly profitable CHC model raises an interesting question: Why just companies? Why not include people who are oppressed by dictatorships? What would it do to dictatorial governments if their middle class and prosperous citizens were able to move a growing portion of their wealth and assets abroad into "safe havens" beyond the reach and control of those governments—and be paid in return for working for a foreign company when they needed their own money? What would it do for those citizens if they could protect some of their assets in "safe havens" instead of having it threatened with seizure by their dictatorial government? And what would it do for the economies of "safe haven" countries if a growing number of people from dictatorial countries worldwide could shelter a growing amount of their prosperity in these safe havens? What if the management companies for those citizens' assets were created in and run from leading nations like the United States, Great Britain and other major countries—and the monies went through those leading nations' banks? The control by dictators might fall over time while those dictatorships' economies might be made more integrated with more types of global business relationships, benefiting corporations as well as citizens. At the same time the fortunes of "safe havens" could rise if they become a new force for human freedom and personal prosperity.

Collectively, corporations are sometimes more powerful than dictatorial governments who may try to coerce or threaten them. Even when they are not more powerful, a propertied corporation is a formidable force that dictatorships must consider and handle differently from an ordinary citizen. Could new collective value accrue to "digitally free people" who live under dictatorships but are enabled to accumulate "stealth wealth" beyond their governments' reach in "safe havens?" Some citizens of leading democracies may want to support this new type of digital freedom for people who live under dictatorships. Some corporations may like this because they may be able to do more business in restricted dictatorial countries. Some free and democratic governments may also like this when they want to see more free and democratic countries worldwide—and fewer dictators.

Two potentials are clear: First, the potential scope of change is large, as exemplified by multi-national corporations deploying their offshore funds around the world rather than paying the penalty to bring their profits into the United States and spend them there. By adjusting to an economic system that appears to drive large profits out of the USA, these companies spent accordingly and shifted millions of jobs from the United States to other countries. Second, the potential velocity of change is large, as exemplified by the transformation of the American economy in a few short decades from the preeminent economic leader with a rising standard of living to middle-class stagnation with economic insecurity for tens of millions of middle-class families.

Is it possible that the corporate CHC model may be that powerful, that important? Combining its a potential large scope of change with its potential velocity of change and enabling oppressed citizens around the world, could dictatorial governments be forced into a different position relative to their citizens? How might this rebalancing of power be produced?

FIG. 252, "Freedom from Dictatorships System—Opening a Free (Stealth) Identity": In some examples a person who lives under a dictatorship owns a Teleportal and can login as a known public identity. That person can create one or more "stealth identities"—which is a digitally free identity of a person who lives under a dictatorship and cannot use their real identity online worldwide. If a secure connection cannot be made login is terminated. Logging in as a stealth identity's initiates one or a plurality of automated and/or manual protections to increase security such as encrypted secure sessions, turning off or logging out of other identities, exiting SPLS's, turning off presence indications, blocking remote access to anything shareable or remotely controllable in a TP device, or disabling other TP device capabilities that may be used to disguise any type of remote monitoring, tracking, connection, etc. In some examples logging in as a stealth identity simultaneously initiates one or a plurality of camouflage and/or disguising actions such as the simulated appearance or presence of a different known or other identity; using synthesis to replace the stealth identity's full or facial image or background, to never appear as one's self; or using deceptive data transmission and reception to hide encrypted stealth identity communications. In some examples a remote server (s) may provide camouflages and/or disguises; and in some examples a TP device's capabilities and/or functions may generate camouflages and/or disguises. In some examples a simulated recorded appearance by a stealth identity's known real public identity may be generated, including date and time stamping, to provide a retrievable alibi. In some examples one or a plurality of protection and/or camouflage settings may be saved for re-use. In some examples protection and camouflage tools and settings may be based on a current "best setup" for stealth identity protection, and that "best setup" may include automatic downloads to update a device's tools, settings and capabilities to provide the current "best setup" available for protecting a person who lives under a dictatorship and requires a stealth identity to have a free digital identity.

FIG. 253, "Freedom from Dictatorships—Free Identities' Connections": After a stealth identity is logged in one or a plurality of monitoring processes provides additional protections such as determining if any others are connected to the stealth identity in any way, if a recording is being made, if there is tracking, if an attempt is being made to intercept or receive and decrypt stealth communications, if an attempt is being made to detect online presence, and to provide a security indication based on any monitoring methods detected. If monitoring detects a risk and automatic and/or manual protections may include actions such as exiting, disconnecting or logging out of the stealth identity; blocking whatever is attempting to penetrate security; presenting an alarm or indicator; shutting down the device; switching device operation to a camouflage or disguised identity and that safe identity's simulated use(s); or sanitize and completely clean a device of all records pertaining to the existence of a stealth identity. Once logged in and secure a stealth identity may open, close and/or end multiple types of connections. In some examples a single stealth connection session may optionally include the additional protection of retrieving and employing an additional encryption key, then deleting it at the end of the session.

FIG. 254, "Freedom from Dictatorships—Free Identities' Tasks": In some examples free identity tasks may include accessing a trans-boarder, extra-national safe haven server, tools, resources and/or services in order to create identities including stealth identities; incorporate CHC's (controlled holding companies) and/or enterprises; open bank accounts in the name(s) of an identity, CHC or enterprise; transfer assets to and between identities, CHC's and/or enterprises; appoint stealth identities or other identities as directors, managers and/or employees of any created CHC or enterprise; engage in any legally permitted form of business, ownership, investment, contracting, production, employment, etc.; receive/send asynchronous and synchronous communications; receive news from around the world; join one or a plurality of public or stealth SPLS(s), governances and organizations to help initiate or support any type of collective action(s); and create a "propertied" support system for living under a dictatorial government. In brief, utilize a stealth identity to become proficient in living a digitally enabled double life where part of it is free and stealth-based.

Turning now to FIG. 252, "Freedom from Dictatorships System—Opening a Free (Stealth) Identity," some examples are illustrated in which a person who lives under a dictatorship (which in some examples may call itself a country living under a state of emergency, in some examples may call itself a military junta, in some examples may call itself a republic, in some examples may call itself a monarchy, in some examples may call itself a theocracy, in some examples may call itself a democracy, in some examples may claim that it is a legitimate government that its citizens recognize and want, and in some examples may call itself another form of government) owns a Teleportal and can login as a known public identity 2741 to an available public or private network. As a naming convention, a "stealth identity" is a digitally free identity of a person who lives under a dictatorship and cannot use their real identity, and cannot attempt the use of a governmentally discoverable "private identity" or "secret identity." In some examples and at some intermittent self-chosen times said logged in public identity 2741 may create one or a plurality of digitally free stealth identity(ies) that operate under a dictatorship as a hidden stealth identity(ies) 2740. In some examples a logged in public identity 2741 may open an encrypted, secure session 2742 2743 (such as in some examples by using encryption 2743 in which each identity selects their own encryption key, in some examples by using a password-protected VPN 2743, and in some examples by another type of secure connection 2743); in some examples said secure connection 2743 may be used to retrieve an additional newly generated secure connection 2744 (such as in some examples a newly generated encryption key 2744, or in some examples another encryption algorithm 2744) and auto-generate a new, secure key from the newly retrieved key 2745, and open an encrypted online session using the new secure key 2746.

In some examples a secure connection cannot be made 2747 and in such a case the attempt to open an encrypted and secure session 2742 is terminated 2748. In some examples a secure connection is made 2747 and in such a case the user may start logging in to a stealth identity with one or a plurality of types of stealth identity (such as in some examples a private identity 2749 [as described elsewhere], in some examples a secret identity 2749 [as described elsewhere], in some examples a plurality of private identities 2749 and secret identities 2749, and in some examples another type of stealth identity 2749). In some examples initiating login with a stealth identity 2749 results in one or a plurality of automated actions and/or manual actions that increase security such as in some examples turning off other identities 2750; in some examples logging out of other identities 2750; in some examples exiting SPLS's 2751; in some examples turning off other presence indications 2751; in some examples blocking remote access to anything shareable 2752 in the TP device in use; in some examples blocking remote access to anything remotely controllable 2752 in the TP device in use; in some examples disabling external control of synthesis 2753 such as utilizing the TP device in use's video synthesis to disguise any type of remote presence or remote connection; in some examples disabling external control of backgrounds 2753 such as utilizing the TP device in use's background substitutions to disguise any type of remote presence or remote connection; or in some examples disabling other TP device capabilities 2753 that may be utilized to disguise any type of remote monitoring, tracking, connection, etc.

In some examples initiating login with a stealth identity 2749 results in each type of secure action 2750 2751 2752 2753 simultaneously causing one or a plurality of corresponding camouflage actions 2756 such as in some examples maintaining the appearance of a different other safe identity 2757 as deceptive camouflage (such as in some examples in some examples a new downloaded safe public identity 2757, in some examples simulating another safe identity in a public SPLS 2757, in some examples utilizing another identity in a simulated focused connection 2757; or in some examples utilizing another identity in a different deceptive method 2758); in some examples maintaining a different known identity 2758 as deceptive camouflage (such as in some examples one or a plurality of one's own public identity(ies) 2758, in some examples simulating one of one's own known identities in a public SPLS 2758, in some examples utilizing one of one's own known identities in a simulated focused connection 2758; or in some examples utilizing one of one's own known identities in another deceptive method 2758); in some examples utilizing a TP device's synthesis to replace one or a plurality of stealth identities' images with safe and different identities' images 2758 as deceptive camouflage (such as in some examples never appearing as one's own complete image in any stealth or cloaked SPLS 2760 and/or focused connection 2758); in some examples utilizing a TP device's synthesis to replace one or a plurality of stealth identities' faces with safe and different facial images 2758 as deceptive camouflage (such as in some examples never showing one's own face in any stealth or cloaked SPLS 2758 and/or stealth identity's focused connection 2758); in some examples utilizing deceptive data transmission 2759 and data reception 2759 to conceal, disguise and/or camouflage encrypted and secure stealth identity communications 2742 2747; and in some examples utilizing the TP device's synthesis to replace any revealing background images with different and safe background images 2760 as deceptive camouflage (such as in some examples never showing one's own real background[s] in any stealth SPLS 2760 and/or stealth identity's focused connection 2760).

In some examples initiating login with a stealth identity 2749 results in some types of secure actions 2750 2751 2752 2753 simultaneously prompting a user with the option to utilize a corresponding camouflage 2756 2757 2758 2759 2760 2761 and/or a corresponding disguise 2756 2757 2758 2759 2760 2761 (such as in some examples turning off identities 2750 provides options for utilizing deceptive other identities 2757; in some examples exiting SPLS's and/or other presence indications 2751 provides options for utilizing deceptive SPLS is 2758, deceptive identities 2758, deceptive facial images 2758, etc.; in some examples blocking access to shareable resources 2752 provides options for utilizing simulated deceptive data transmissions and receptions 2759 for parallel functions; in some examples blocking access to remote control 2752 provides options for utilizing simulated deceptive data transmissions and receptions 2759 for parallel functions; in some examples other types of blocked access 2752 provides options for simulating those types of functions with deceptive data transmissions and receptions 2759; in some examples disabling and blocking certain types of syntheses 2753 provides options for deceptive syntheses that replace those functions 2760; in some examples disabling and blocking syntheses of backgrounds 2753 provides options for deceptive replacement with safe backgrounds 2760; and in some examples other types of security actions simultaneously prompt a user with options to employ parallel and corresponding simulations 2756, camouflages 2756, and disguises 2756).

In some examples one or a plurality of server(s) 2761 may provide camouflages 2756 and/or disguises 2756 such as in some examples securely provide deceptive other identities 2757; in some examples securely provide deceptive safe known identities 2758; in some examples securely provide deceptive safe facial images 2758; in some examples provide deceptive simulated data transmission 2759; in some examples provide deceptive simulated data reception 2759; in some examples securely provide one or a plurality of deceptive backgrounds 2760; and in some examples securely provide other types of deceptions that may be supplied by one or a plurality of servers 2761. In some examples a TP device's capabilities and/or functions may generate one or a plurality of camouflages 2756 and/or disguises 2756 such as in some examples generate deceptive safe other identities 2757; in some examples generate deceptive safe known identities 2758; in some examples generate deceptive safe facial images 2758; in some examples generate deceptive simulated data transmission 2759 and some examples generate deceptive simulated data receptions 2759; in some examples generate deceptive backgrounds 2760; and in some examples generate other types of deceptions 2761. In some examples a remote TP device's capabilities and/or functions may generate one or a plurality of simulated recorded appearances by the known real public identity, including date and time stamping, to provide a retrievable alibi 2761 that may serve as a camouflage or disguise for actions that occurred at that time by a stealth identity.

In some examples individual settings may be made such that initiating login with a stealth identity 2749 in some examples prompts and allows the logging in user to choose one or a plurality of security settings 2750 2751 2752 2753; in some examples prompts and allows the logging in user to choose one or a plurality of camouflages 2756 2757 2758 2759 2760 2761 and/or disguises 2756 2757 2758 2759 2760 2761; in some examples displays the current settings 2750 2751 2752 2753 2756 2757 2758 2759 2760 2761 before performing them; and in some examples prompts and allows the logging in user to save any changes made in the current settings 2750 2751 2752 2753 2756 2757 2758 2759 2760 2761 for future re-use. As described elsewhere, in some examples the settings displayed 2750 2751 2752 2753 2756 2757 2758 2759 2760 2761 may be based on a current "best setup" for individual protections (such as in some examples matching one's current setup and offering to retrieve the currently best available tools, software, settings, resources, steps, etc.); and in some examples the settings displayed 2750 2751 2752 2753 2756 2757 2758 2759 2760 2761 may be based on automatically downloading and updating one's device to provide the current "best setup" available for individual protections.

In some examples after appropriate security, camouflage and disguise steps are performed then login with a stealth identity 2749 is completed 2754, and stealth identity connections are enabled. In some examples an optional security policy for stealth identity connections may include the right to open outbound connections only 2762, and in some examples an optional security policy for free identity connections may include preventing the reception or acknowledgment of inbound connections by that stealth identity 2762.

In some examples a stealth identity is enabled 2740 2754 2756 and logged in 2740 2762. Turning now to FIG. 253, "Freedom from Dictatorships—Free Identities' Connections," some examples illustrate continuous real-time monitoring 2766 that provides some additional protections for free identities (that is, stealth identities) who live under a dictatorship while they are logged in and connected as a stealth identity. In some examples a stealth identity's online actions and connections are monitored in one or a plurality of ways with said monitoring utilized in some examples to identify whether or not any others receive indications of their presence 2767; in some examples to identify whether or not any others are connected to them 2767 in any way; in some examples to determine whether or not any recording is being made 2768 in any way such as by any device, application, server, service, and/or other means; in some examples to determine if that stealth identity is being tracked 2769 in any way; in some examples to determine if any attempt is being made to receive and decrypt that stealth identity's communications 2770; in some examples to determine if any attempt is being made to intercept and decrypt that stealth identity's communications 2770; in some examples to determine if any attempt is being made to detect the online presence of that stealth identity 2771; in some examples to determine if any attempt is being made to detect the existence of that stealth identity 2771; and in some examples to utilize these and other monitoring methods to form a determination that the logged in stealth identity remains in some examples stealthy 2772, in some examples cloaked 2772, in some examples private 2772, in some examples secret 2772, and in some examples unknown to any who are not directly contacted 2772.

In some examples if a logged in stealth identity is monitored 2766 and no current risks are detected 2767 2768 2769 2770 2771 then a "secure" indicator 2772 may be displayed by one or a plurality of means (such as in some examples a visual indicator 2772, in some examples a periodic audible indicator 2772, in some examples an indicator that is hidden but available on demand 2772, in some examples by another type of indication means 2772). In some examples a logged in stealth identity is monitored 2766 and a risk is detected 2767 2768 2769 2770 2771 2773 (such as in some examples another receives a detectable presence indication of the stealth identity 2767 2773; in some examples another manages to initiate a connection to the stealth identity 2767 2773; in some examples the making of a recording of the stealth identity is detected 2768 2773; in some examples tracking of the stealth identity is detected 2769 2773; in some examples detection determines an attempt is being made to receive and/or decrypt the stealth identity's communications 2770 2773; in some examples detection determines an attempt is being made to intercept and/or decrypt the stealth identity's communications 2770 2773; in some examples detection determines an attempt is being made to detect the online presence of the stealth identity 2771 2773; in some examples detection determines an attempt is being made to detect the existence of the stealth identity 2771 2773; in some examples detection determines another method is attempting to detect the presence or use of the stealth identity 2773; and in some examples detection determines another method has detected the presence or use of the stealth identity 2773); in some examples protection may automatically exit the stealth identity 2774; in some examples protection may automatically logout of the stealth identity 2774; in some examples protection may automatically disconnect the stealth identity 2774; in some examples protection may automatically place additional blocks (as described elsewhere) on what ever is attempting to penetrate the security of the stealth identity 2774; in some examples protection may employ one or a plurality of means to present an intrusion alarm 2775 (such as in some examples a continuous visual indicator 2775, in some examples an intermittent visual indicator 2775, in some examples an audible indicator 2775, in some examples an indicator that is hidden but available on demand 2775, in some examples by another type of indication means 2775); in some examples protection may automatically shut down the device 2776; in some examples protection may automatically switch device operation to a camouflage identity 2756 and that identity's simulated operation(s); in some examples protection may automatically switch device operation to a disguised identity 2756 and that identity's simulated operation (s); in some examples protection may automatically sanitize and completely clean a device of all records pertaining to the existence of a stealth identity 2778 (such as in some examples over writing the stealth identity's deleted files such that they cannot be identified and/or recovered, or in some examples providing other forms of identity protection that prevent the stealth identity from being discovered or used against that person); in some examples protection may automatically use other means to protect the stealth identity 2766.

In some examples protection may automatically employ a combination of two or a plurality of protections 2774 2775 2776 2777 2778; in some examples protection may include one or a plurality of automatic protections 2774 2775 2776 2777 2778 and present the stealth identity with additional manual options 2774 2775 2776 2777 2778; in some examples protection may be set so that no automatic protections are performed 2774 2775 2776 2777 2778 and upon detection 2767 2768 2769 2770 2771 2773 the stealth identity is presented with manual protection options 2774 2775 2776 2777 2778; and in some examples protection may include a combination of automatic and manual protections 2774 2775 2776 2777 2778 that are set by a stealth identity. In some examples protection from monitored security violations may include a "best setup" combination of automatic and manual protections 2774 2775 2776 2777 2778 that are set by a source of "best practices" protections 2798. and in some examples a stealth identity may receive and adopt a "best setup" combination of automatic and manual monitoring protections 2798 (such as downloading a predefined set of detection and protection tools 2798, in some examples software 2798, in some examples settings 2798, in some examples steps 2798, etc.) that prioritizes one or a plurality of monitoring methods for continuous use, frequent use, periodic use, infrequent use or non-use 2776 2779; along with scheduling the pre-planned use of one or a plurality of automatic and/or manual protection methods 2774 2775 2776 2777 2778 in the event a stealth identity is detected 2767 2768 2769 2770 2771 2773.

In some examples one or a plurality of monitoring methods is performed continuously in real time 2766; in some examples one or a plurality of monitoring methods is performed periodically 2766; in some examples one or a plurality of monitoring methods is performed at the manual request of a user 2766; in some examples a user may set and save a group of monitoring methods as the preferred types of monitoring to be performed with greater frequency 2766; in some examples a user may set and save a group of monitoring methods as monitoring methods to be performed with lesser frequency 2766; in some examples a user may set and save a group of monitoring methods as monitoring methods that are turned off and not performed at all 2766; and in some examples a stealth identity's device may receive a "best setup" 2779 that includes prioritizing one or a plurality of monitoring methods for continuous use, frequent use, periodic use, infrequent use or non-use 2776 2779. In some examples a stealth identity's monitoring settings 2779 are saved in one or a plurality of encrypted and/or disguised files 2779; and in some examples a stealth identity's protection settings 2779 are saved in one or a plurality of encrypted and/or disguised files 2779. In some examples the act of saving settings 2779 may trigger the optional (and in some examples manually initiated) matching and retrieving a "best setup" for monitoring 2798 and protecting 2798 a stealth identity.

In some examples a stealth identity is logged in and able to open, close and/or end a connection 2780 such as in some examples open a private identity's stealth SPLS 2782 (as described elsewhere) and if selected open that stealth private SPLS 2783; in some examples open a private identity's stealth focused connection 2784 (as described elsewhere) and if selected open that stealth private focused connection 2785; in some examples open a secret identity's stealth SPLS 2786 (as described elsewhere) and if selected open that stealth secret SPLS 2787; in some examples open a secret identity's stealth focused connection 2788 (as described elsewhere) and if selected open that stealth secret focused connection 2789; in some examples open another type of secure communication 2780; in some examples close a private identity's stealth SPLS 2790 SPLS 2791, and if it optionally utilized a new session encryption key 2794 2795 2796 then delete its session encryption key 2791; in some examples close a secret identity's stealth SPLS 2790 2791, and if it optionally utilized a new session encryption key 2794 2795 2796 then delete its session encryption key 2791; in some examples close a private identity's stealth focused connection 2792 2793, and if it optionally utilized a new session encryption key 2794 2795 2796 then delete its session encryption key 2793; in some examples close a secret identity's stealth focused connection 2792 2793, and if it optionally utilized a new session encryption key 2794 2795 2796 then delete its session encryption key 2793; and in some examples close or end another type of secure communication 2780 and if it optionally utilized a new session encryption key 2794 2795 2796 then delete its session encryption key.

In some examples an additional temporary protection means may be employed. In some examples when a stealth identity opens a connection (such as in some examples a stealth private SPLS 2783, in some examples a stealth private focused connection 2785, in some examples a stealth secret SPLS 2787, in some examples a stealth secret focused connection 2789, and in some examples another type of secure connection 2780) those parties only may (optionally) retrieve a new session key 2794 from a secure source; those parties may (optionally) generate a new key 2795 from the new session key 2794; and in some examples those parties may (optionally) encrypt their communications 2796 using the newly generated key 2795. In some examples when a stealth identity closes a connection (such as in some examples a stealth private SPLS 2783, in some examples a stealth private focused connection 2785, in some examples a stealth secret SPLS 2787, in some examples a stealth secret focused connection 2789, and in some examples another type of secure connection 2780) those parties delete its session encryption key 2791 2793 2780.

Turning now to FIG. 254, "Freedom from Dictatorships—Free Identities' Tasks," some examples are illustrated of tasks 2802 2814 2826 that may be performed by a digitally free "stealth identity" of a person who lives under a dictatorship to produce alignment between personal interests and a digital reality that practices personal freedom and encourages personal security. In some examples stealth identity tasks may be performed by digital means in a trans-boarder, extra-national safe haven (in which a safe haven includes the countries used by a substantial number of global corporations that have created CHC's [controlled holding companies] to legally move portions of their assets to safe havens in order to receive financial, legal and business benefits—such as sheltering billions of dollars of profit in secure off-shore businesses and bank accounts that are beyond the reach of national governments) with secure, private banking and private incorporations 2814.

In some examples stealth tasks may include one or a plurality of creating a new public identity(ies) and/or stealth identity(ies) 2815 that have citizenship in the safe haven (if permitted by a safe haven, and if not permitted then appointing one or a plurality of local agents instead); in some examples a new identity (with or without citizenship in the safe haven) may create one or a plurality of stealth identities 2815 (herein meaning a digitally free identity that is relatively untraceable but is owned by a person who lives under a dictatorship, or if not permitted then appointing local agents instead); in some examples one or a plurality of stealth identities 2815 may engage in any legally permitted form of business (or if not permitted then appointing local agents instead); in some examples may create a controlled holding company (CHC) 2816 that in some examples are owned by a public identity, in some examples are owned by a stealth identity(ies) 2815, in some examples may be a corporation 2816, in some examples may be a trust 2816, or in some examples may be another type of legal entity 2816; in some examples a CHC 2816 may create an active corporation(s) 2817 and/or active business(es) 2817 (herein collectively named "enterprises") that are located in any country of the world, and in some examples are owned in whole or in part by an existing identity, in some examples are owned in whole or in part by a stealth identity(ies) 2815, and in some examples are owned in whole or in part by a CHC 2816 (such as in some examples a CHC that creates a United States Corporation that has a bank account in a United States bank); in some examples one or a plurality of CHC's 2816 and enterprises 2817 may engage in any legally permitted form of business; in some examples a CHC 2816 and/or an enterprise 2817 employ an existing identity as a director 2818 of one or a plurality of enterprises 2817, and in some examples employ a stealth identity 2815 as a director(s) of one or a plurality of enterprises 2817; in some examples a CHC 2816 and/or an enterprise 2817 may open one or a plurality of bank accounts 2819 each in their own name(s) 2816 2817 and/or in the name(s) of one or a plurality of stealth identity(ies) 2815; in some examples a CHC 2816 and/or an enterprise 2817 may use private or secret virtual meetings to manage and run any legal entity(ies); in some examples transfer assets 2820 to or between one or a plurality of enterprises 2821, bank accounts 2819, CHC's 2816, real public identities, stealth identities 2815, or legal entities; in some examples rent or lease back the transferred assets 2820 from an enterprise owned by a CHC, and in some examples make monthly rent payments that ultimately wind up in a CHC's bank account 2819 in a safe haven country 2814; in some examples receive employment income or other types of legal payments from a CHC 2816 and/or an enterprise 2817; in some examples as the funds in bank accounts accumulate, use those funds to buy real estate 2822; make investments 2822; or work with others such as some in similar circumstances, and some advisors or agents who wish to help them to plan and develop various types of "propertied escapes" 2822; in some examples as the funds in bank accounts accumulate, become proficient in living a digitally enabled double life 2823; and in some examples as the funds in bank accounts accumulate, work with others to develop external and internal means to change some dictatorships to permit greater freedoms and prosperity by their citizens 2822.

For one example a person living under a dictatorship can transfer some assets so they are owned by their own CHC in a safe haven country, pay rent on those assets to a property management company created in another country, and receive an employment pay check from one or a plurality of wholly owned enterprises abroad. For another example a number of people living in one dictatorship can each transfer assets to a safe haven CHC that they own, and a plurality of CHCs may in turn lease their assets to a United States property management corporation, so they can rent their assets from a large US company but have most of their payments wind up paid into a holding company's bank account that they own in a tax-free safe haven country—over time turning their money into independent wealth outside of their dictatorship's control. Furthermore, the large US company now has a sizable business interest in that dictatorship and may be able to exert influence on behalf of the large and growing number of properties that it owns.

For another example Teleportals enable increased awareness and contacts between people in one or a plurality of specific locations including local business opportunities, local people, local resources and other local capabilities in many of the connected locations. In some examples an identity in one part of the world can work in another part of the world, and simultaneously research how to open a new CHC and/or enterprise where a business opportunity exists in a different part of the world—and be paid for their work as well as learning how to do business elsewhere. In return, part of the mutual payments from these trans-border working relationships may be systems and services that help people shelter their assets and protect themselves by using trans-border enterprises that are located in other parts of the world.

For another example a person may live in a country with an potentially violent dictatorial government and be at risk for losing everything at a dictatorial official's whim, and in some examples that person may be able to use a stealth identity and a safe haven to transfer assets to one or a plurality of wholly owned CHC's or enterprises that are located in a more secure country with more secure laws and property rights, and in some examples those more secure CHC's and enterprises located in more secure countries may have greater success in protecting the ownership of those assets by those people, by defending their title with a secure country's legal entity and through its more secure legal system (and perhaps also involving its political system) instead of keeping those assets and those protections solely under the control of a dictatorial government's official.

Therefore, in some examples free identity tasks may include in some examples creating one or a plurality of secret identities 2803, in some examples creating one or a plurality of private identities 2803, in some examples creating one or a plurality of public identities 2803, and in some examples creating one or a plurality of stealth identities 2803; in some examples incorporating one or a plurality of CHC's (controlled holding companies) 2804, in some examples incorporating one or a plurality of corporations or businesses 2804, in some examples incorporating one or a plurality of trusts 2804, and in some examples establishing one or a plurality of legal entities 2804 (herein collectively named "enterprises"); in some examples opening one or a plurality of bank accounts 2805 in some examples by one or a plurality of identities 2803, and in some examples by one or a plurality of enterprises 2804; in some examples a created identity 2803 may run a created enterprise 2804 that earns assets that may be in any form such as in some examples bank accounts 2805, in some examples real estate, in some examples assets in a financial brokerage account; and in some examples any other type of asset or property; in some examples an identity 2803 and/or an enterprise 2804 may spend, use, encumber and/or perform any other legal action with accumulated assets 2807; in some examples an identity 2803 and/or an enterprise 2804 may join one or a plurality of public or stealth SPLS(s) 2808, in some examples one or a plurality of public or stealth governances 2808, and in some examples one or a plurality of public or stealth organizations 2808 to help initiate or support any type of collective action(s) 2808 such as in some examples to create better lives for people who live under dictatorships; in some examples an identity 2803 and/or an enterprise 2804 may use their digital access to check communications 2809 which in some examples may be public communications 2809, in some examples private communications 2809, in some examples secret communications 2809, and in some examples stealth communications 2809; and in some examples an identity 2803 and/or an enterprise 2804 may perform other free person tasks 2810.

In some examples people who live under a dictatorship may gain new abilities to work as a free and independent digital person 2826 with other identities, enterprises and governments around the world. In some examples of these may include the ownership, accumulation and use of trans-border, extra-national identities 2826, in some examples enterprises 2826, in some examples assets 2826, in some examples bank accounts 2826, and in some examples personal capabilities that are beyond the control of their dictatorial government 2826. While their physical body and families remain controlled, the availability of digital realities through an ARTPM 2826 provides new means for them to support the evolution of personal freedom in spite of their dictatorial government.

If digital realities become increasingly used such as those envisioned by the ARTPM and some of its components (such as Teleportal devices in some examples), new means may evolve to rebalance power between governments and both personal actions and collective actions. As a result, individuals may make the creation and use of freedoms in other countries a normal part of everyday life for citizens who live in a dictatorship—even if their personal freedoms must be hidden and stealthy under some forms of governments.

The hope is simple. That as the Earth becomes one large digital room, new systems will support and strengthen freedom for those who are oppressed, rather than perpetuate dictatorships that continue to build monuments to their control and human oppression.

SOME AKM DEVICES EXAMPLES—BOTTOM-UP PROCESSES: TRANSFORMED DEVICES, TRANSFORMED DEVICE USE, AND TRANSFORMED DEVICE EVOLUTION ("ANTHROTECTONICS"): In FIGS. 255 through 263 an example device is a digital camera because current models of digital cameras already include features that illustrate an expanding range of capabilities for being connected to a growing range of external resources and controls: Some scene modes are often included and some of these are based on customer goals (portraits, action sports, night photographs, etc.). A growing number of digital cameras include both photographs and video recording. Some cameras include the means to identify picture problems and communicate them, such as "blur," "shake," "face out of focus," "eye blink" and other types of warnings. Some digital cameras include Wi-Fi so they can connect to a wireless network. Some digital cameras (with additional software and sometimes a cable) can connect to a computer or smart phone for direct computer control of the camera's settings and picture taking. Some digital cameras come with an (optional) free account at an online picture storage and picture sharing "community". A few digital cameras can automatically connect to any of thousands of public Wi-Fi "hot spots" and automatically upload their pictures to an account at an online photo "community".

With an example device (digital camera) and numerous aspects of an AKM covered, we now turn to how the AKM provides interactive online evolution of current devices into new devices and governances that reflect the actual intentions and goals of their users. This may occur by a series of component systems and processes within the AKM that may eventually lead to transformed devices and governances that are dynamic instantiations of users goals, improved knowledge, the largest gaps to close between current devices and users' goals, and how to achieve those goals both individually and collectively by means of transformed devices and governances. In other words, the AKM includes components that may be instrumental for transforming current "mature" device designs (which include physical products, equipment, services, information, entertainment, etc.) into continuously realigning and evolving instantiations of customers' changing goals, needs and desires: In a first "current stage" the AKM operates in "mature" devices such as a digital camera (whether a point-and-shoot camera or a DSLR [Digital Single Lens Reflex] camera), which is illustrated at a high level in FIG. 255. In this current stage FIGS. 256 and 257 illustrate how the AKM may improve initial uses of devices when users must learn what features it has, how to find the features, how to use the features to get the results desired, etc. Also in this current stage FIG. 258 illustrates how the AKM can improve how well a user learns new features, as well as FIG. 259 illustrating how the "best available" AKI and AK are determined for a device, and the bottom of FIG. 258 illustrating the initial steps from AKM data into the device improvement (and eventually transformation) process. Finally in the current stage FIG. 260 illustrates domain learning, which is when a user has the goal of doing something in a new area and a device is part of that, the AKM can provide focused AKI/AK on how to use the device to achieve that goal successfully.

At this point this AKM is able to connect the goals of users, the AKI and/or AK knowledge they need to reach their goals, with potential design needs for future versions of that device (s). This enables reconceptualizing that "mature" device to increase customer success and satisfaction (illustrated herein in FIG. 261). By the AKM's surfacing of activity-level, device-level, vendor-level, market-level and other in-use data so that human intentions, activities and success gaps are made visible and accessible, FIG. 261 shows how the AKM aggregates data that can expand vendor opportunities to provide reconceptualized devices that raise the rates of customer success and satisfaction.

Next, FIG. 262 shows how vendors can provide devices and associated AKM services that precisely fit individual user goals for the successful use of devices. Finally, FIGS. 265 and 266 illustrate how governances may provide "packages" that include a plurality of devices that increasingly fit customers' lifestyles and goals with continuously increasing levels of success and satisfaction.

This overall AKM transition is summarized in FIG. 267 which shows a timeline of three stages between multiple instantiations of local products, the evolution of more uniform global products, and a potential evolution of AKM alignment between active knowledge and means to raise the average rates of human success due to reconceptualized devices. The AKM ramifications are summarized in FIG. 268 that illustrates the AKM's ability to dynamically and continuously reconceptualize devices and governances to match humanity's changing and emerging needs and desires: Due to the AKM both devices and governance may become dynamic instantiations of our real goals, new knowledge, actual gaps from use, and how to apply those to achieve humanity's goals both individually and collectively.

Ultimately, as illustrated in FIGS. 255 through 268, the AKM is designed to produce transformations that begin with transformed results from using current devices, then move on to transforming the devices themselves. This, in turn, transforms not just devices but the nature and quality of the marketplace and world in which we live so that it delivers more of what people indicate they want and need by both their actions and by their self-controlled choices (by means such as transformed devices, transformed services, transformed governances, etc.). Thus, the AKM is ultimately intended to provide one or a plurality of user-based transformations from current devices, systems and dominant organizations that often use mass marketing, mass communications and other means to "push" large numbers to focus on current products, current uses, goals, etc. that they are told they should want and need. If successful, this would indeed be an Alternate Reality from our own, and a transforming departure from current practices. Although some examples of devices transformation (s) have been disclosed, in some examples utilizing means such as "AnthroTectonics" and in some examples other means, along with variants, in the examples the components may consist of any combination of devices, components, modules, systems, processes, methods, services, etc. at a single location or at multiple locations, wherein any location or communication network(s) includes any of various hardware, software, communication, security or other components.

PHOTOGRAPHY AKM MACHINE—SOME AKM DEVICES EXAMPLES—DIGITAL PHOTOGRAPHY: FIG. 255 "AKM Device Example" illustrates the AKM operating in to assist the users of a device (such as a digital camera, whether a point-and-shoot camera or a DSLR [Digital Single Lens Reflex] camera). This begins with the device 8001 which is a digital camera, whether a point-and-shoot camera 8002 or a DSLR 8003. Because of the complexity of photography and the inadequacies in current camera designs, users encounter inevitable problems, issues and/or frustrations 8004 in taking the pictures they would like. Some of the types of problems include features 8005 and how to set them 8005 (such as arpeture priority and arpeture settings, shutter priority and shutter settings, etc.), locations and types of controls 8006 (such as when a specific scene mode is needed and how to access it quickly at that moment), and the camera's abilities to communicate 8007 with resources that may provide assistance. These also include the camera's ability to identify picture problems 8004 8005 8006 8007 and communicate them, such as "blur," "shake," "face out of focus," "eye blink" and other types of warnings.

These also include user requests for assistance (AKI) or information (AK) whether made through the device 8007 or through an AID/AOD 8007, and together with issues the camera identifies 8004 constitute triggers 8008 that are communicated to the AKM 8012 which includes components such as retrieving appropriate AKI/AK 8009, retrieving AKM sponsor and/or advertisements 8010, additional services for identified users 8011, etc. These and other AKM resources are identified, retrieved and combined 8013; formatted for the user's device(s) and context 8016; sent to said user's device 8016 and/or AID/AOD 8016; where it is received 8017 8020 and used 8017 8020. If "Direct AKI" 8020 is available, retrieve and deliver that in case the user wants to employ that to auto set the device 8001 without needing to learn how to set the device manually.

The results from using AKI/AK 8009 8017 8020 are (optionally) tracked, measured, collected, stored and reported 8021, as are results from the use of marketing and/or advertising 8010 8017 8020; and tracked results are available in various types of AKM reporting, dashboards, etc. 8022 8023 from both the AKM and from third-parties 8022 8023. These enable current users and prospective buyers of the device 8001 to see and understand the types of problems, issues and successes users have, and each's frequency or severity, when trying to employ the device for a range of uses—along with the ability to see if relevant AKI/AK solves those issues and analyzed data such as the percentage of issues solved.

Simultaneously and in parallel, new AKI/AK from a variety of sources 8015 may be tested 8014 to determine the "best available" AKI/AK for retrieval 8009 at that trigger 8008, to determine the best message construction 8013, the best formatting 8016, the best delivery 8016, and the best types of use 8017 8020. Also simultaneously, various means are provided for optimizing AKI/AK 8018 such as by employing various types of testing 8014, or various types of optimization methods to apply the results from testing 8014.

AKM INITIAL USES OF A DEVICE (DIGITAL PHOTOGRAPHY): FIG. 256 "AKM Initial Uses of a Device (Digital camera)" illustrates when a user has never used a device before and must learn what features it has, how to find the features, how to use the features to get the results desired, etc. To start using the device's AKM, a user begins using the device. In this case, a user starts using a digital camera 8026 for the type(s) of photographs wanted, whether a point-and-shoot camera 8027 or a DSLR 8028. Because taking a sharp and clear picture is sometimes difficult, users sometimes take blurry pictures 8029 or a somewhat clear picture that is not sharp enough 8029. In the former case a camera may provide an automated trigger such as a "blur warning" 8030, and in the latter case a user may make an AKM request 8030 by means such as the device or an AID/AOD 8030. In either or both of these trigger types 8030 the user may (or may not) be asked whether to send just the picture's (EXIF) data 8034 or that and the photograph also 8033, and (optionally) other information (as described in FIG. 257 8058 8059. If the user chooses to not send the trigger 8032, then the user has the result of the blurry picture, no AKI or AK, and the task of fixing the problem him/herself 8032. If the user chooses to request AKI/AK, then the user may (optionally) also choose whether to send EXIF data only 8034, or EXIF data with the relevant blurred photo (s) 8033.

When the trigger is received by the AKM 8036 the trigger is parsed 8037 including the trigger (and whether it includes EXIF data only or EXIF data and a photograph(s)), task, device, etc.); AK resources are accessed 8038; and the AKI/AK needed is retrieved 8039 (a process described in more detail 8040 in FIG. 257). For delivery 8042, the AK resources retrieved 8036 8040 are combined with appropriate marketing information 8044 from AK sponsors and advertisers into a single message 8043; formatted for delivery 8045 based on attributes such as the content, media, device, etc.; and (optionally) fitted to identified users' preferences 8046 such as their preferred AIDs/AODs 8047 if they are currently in use 8046. If said AKM message(s) 8045 is sent to the device 8026 it is used and (optionally) tracked and/or measured results are communicated and received 8048. If said AKM message 8045 is sent to the user's preferred AID/AOD 8047 it is used and (optionally) tracked and/or measured results are communicated and received 8048.

Whether the AKI/AK are used in a device 8026 8027 8028 or in an AID/AOD 8047, results may be (optionally) tracked, measured, collected and stored 8048 by the AKM or by third-parties as described elsewhere. Aggregate AKI/AK results 8048 are used in multiple ways such as reporting to users to improve device use and selection 8050 (which creates market and customer pressure for vendors to make improved devices); and reporting to vendors to develop improved, optimized and transformed devices (digital cameras in some examples) 8049 that provide higher rates of customer success and satisfaction.

Turning now to FIG. 257, the AKI/AK access and retrieval process is illustrated: If a point-and-shoot camera 8063 AKI suggests one or more "scene mode(s)" to use, along with how to turn it on/off in that camera model; AK provides explanation of that scene mode 8064 8065 plus related scene modes to try. If a DSLR 8067 AKI suggests correct camera settings for one or more photo type(s) 8068 along with how to turn that on/off in that camera model; AK explains that type of picture 8064 8065 and typical settings that produce good results. With any type of camera advertising 8065 and/or marketing 8065 may (optionally) be included with AKI/AK. If "Direct AKI" is available 8066, retrieve and deliver that in case the user wants to employ that to auto-set the device without learning how to set the device manually.

When the AKM receives the trigger 8036 8040 in FIG. 256 8052 in FIG. 257 it may include EXIF data and a photograph (s) 8054. In this case the AKM may (optionally) analyze the trigger's problem (blur warning) and the photo type by means of photo analysis 8054 such as single person, group, action, etc.; and local photo conditions 8055 such as for day/night the photograph's time taken; for indoor/outdoor use of flash and/or sky or ceiling objects; if outdoor weather such as overcast or full sun; etc. In some examples other data may be available and received such as in some examples GPS, the compass direction in which the picture was taken, local weather conditions (such as in some examples determining the picture was taken on a beach pointing toward the ocean with the sun backlighting the subject; or in some examples determining the picture was taken in a hotel lobby toward a garden window with the outdoor light backlighting the group standing in front of the window; in some examples determine the picture was taken pointing upward at wildlife in a tree; in some examples determine the picture was taken at night with a full moon appearing in the picture's sky; or in some examples determining other local photographic conditions from any combination of available GPS, compass, photograph data, picture analysis, weather data, relative sun position, moon cycle and relative moon position [if at night], and/or other related data). The AKM may also (optionally) interact with a device user to obtain specific information not available from automated data acquisition (such as photo type 8058 or local conditions 8059). Once a device's attributes and available data are known (such as photo type and/or local conditions; whether by retrieval, analysis, interaction[s] or a combination), then retrieve as AKI/AK the appropriate AKI/AK (in this case, the camera settings options 8062): If a point-and-shoot camera 8063 AKI suggests one or more "scene mode(s)" to use, along with how to turn it on/off in that camera model, optionally including one or a plurality of sample photos to illustrate a desirable result and/or provide a model of what to produce; AK provides explanation of that scene mode 8064 8065, plus related scene modes to try. If a DSLR 8067 AKI suggests correct camera settings for one or more photo type(s) 8068 along with how to turn that on/off in that camera model; AK explains that type of picture 8064 8065 and typical settings that produce good results. With any type of camera, advertising 8065 and/or marketing 8065 may (optionally) be included with AKI/AK. If "Direct AKI" is available, retrieve and deliver that in case the user wants to employ that to auto set the device without learning how to set the device manually.

In any of these cases, provide the appropriate AKI/AK 8062 8069 to the process described in more detail 8040 8039 in FIG. 256 and elsewhere. If the device's user is an identified user, after a number of uses and successes, AK may (optionally) offer more advanced AK information for that user's stored type(s) of task(s), activity(ies) or goal(s), in some examples more advanced how-to AKI or more detailed options via AK documents, multimedia, how-to videos, etc.

AKM NEW FEATURES LEARNING IN A DEVICE (DIGITAL PHOTOGRAPHY): FIG. 258 "AKM New Features Learning (Digital Camera)" illustrates how the AKM can improve how well a user learns new features such as needing to find a feature that has not been used before, or needing to learn how to use it successfully. This figure also provides stages and timeline for AKM device transformations. To find new features the user again uses the device. In this case a user tries to use a digital camera 8072 for the type of photograph wanted, whether a point-and-shoot camera 8073 or a DSLR 8074. Because finding a feature, or taking a new kind of picture may be complicated due to the number and types of camera controls available, users may have difficulties 8075 such as finding the feature or controls needed to take a type of picture, or knowing how to set those controls to take that picture successfully. In such a case a user may "fumble" with the controls 8076 by switching between them several times, and in this case the user may (or may not) be asked if AKI/AK is needed 8076 8077. Also, a user may make an AKM request 8076 by means such as the device or an AID/AOD 8076. If the user is asked whether "features" AKI/AK is wanted and the user chooses to not send the trigger 8077, then the user has the result of not knowing how to find the feature or set the camera, no AKI or AK, and the task of fixing the problem him/herself 8078. If the user chooses to request AKI/AK 8077, then the user may (optionally) also choose whether to include the last # of "fumbled steps" from the device buffer (if available) 8079, and (optionally) other information such as described in FIG. 257 8058 8059.

When the trigger is received by the AKM 8080 the trigger is parsed including the trigger (and whether it includes optional data such as steps from the device buffer 8079, and other information 8079 such as the photo type wanted and local conditions; AK resources are accessed 8080; and the AKI/AK needed is retrieved 8080 (a process described in more detail 10301 in FIG. 259, though the focus of this figure moves to providing the "best available" AKI/AK). For delivery 8082, the AK resources retrieved 8080 8081 are combined with appropriate marketing information 8085 from AK sponsors and advertisers into a single message 8082; formatted for delivery based on attributes such as the content, media, device, etc.; and (optionally) fitted to identified user's preferences 8082 such as their preferred AIDs/AODs 8086 if they are currently in use 8086. If said AKM message(s) is sent to the device 8072 it is used and (optionally) tract and/or measured results are communicated and received 8088. If said AKM message 8082 is sent to the user's preferred AID/AOD 8086 it is used and (optionally) tract and/or measured results are communicated and received 8088.

Whether the AKI/AK are used in a device 8072 8073 8074 or in an AID/AOD 8086, results may be (optionally) tracked, measured, collected and stored 8088 by the AKM or by third-parties as described elsewhere. Aggregate AKI/AK results 8088 are used in multiple ways such as reporting to users to improve device use and selection 8090 (which creates market and customer pressure for vendors to make improved and transformed devices).

FIG. 258 also provides stages and timeline for AKM device transformations 8092 due to the AKM's visible interactions with customers during their use of devices, along with the results of what produces customer success and satisfaction based on customers' real goals, which includes: Stage 1 Learning 8093: As described elsewhere, the "best available" AKI/AK is determined by various testing mains, optimization means, etc., in some examples FIG. 259 includes means to determine the "best available" AKI/AK 10302 10316 10309 10320. Stage 2 Delivery 8094: That continuous improvement process 8093 8095 may be used to deliver better AKI and AK 8094 that increases areas such as the rates of success, satisfaction, product selection, etc. 8094. Stage 3 Transform devices 8096: Aggregate AKI/AK results 8088 are reported to vendors 8096 (such as activities, tasks, needs, goals, issues, gaps from successful achievement, AKI/AK delivered, resulting outcomes, etc.) to develop improved, optimized and transformed devices (cameras in some examples 8089). Stage 4 Sell and use transformed devices 8097: When improved devices go into use 8097, restart the Stage 1 8093 learning process but begin it at the highest achieved Stage 2 8094 and Stage 3 8096 levels so that transformed devices begin a new round of further improvements and successive transformations. See "AnthroTectonics" and FIG. 268 below, as well as other explanations, for additional description of continuous AKM transformations of devices.

FIG. 259 "Continuous Improvement of 'Best Available' AKI/AK Retrieval" illustrates how the "best available" AKI and AK are determined for a device, including testing new or updated AKI/AK content from multiple sources. When the AKM receives the trigger 8080 8081 in FIG. 259 it may include any combination of trigger data from a device 8072 8073 8074 8075 8076 or from an AID/AOD 8076, including optional information such as the last # of "fumbled steps" from the device buffer (if available) 8079, and various types of other information 8079 provided by means of a user interaction(s). With this system it is advantageous when the AKM is able to determine the "best available" AKI and AK for one or a plurality of needs.

This is begun 10301 by means described in more detail elsewhere such as in FIGS. 228 through 234 and elsewhere, but summarized here in FIG. 259. As illustrated, a percentage of anonymous users 10302 are included in testing to develop and determine the "best available" AKI and AK for this need. Those anonymous users who are not included in testing, as well as identified users whose AKM record(s) specifies that they do not wish to participate in testing, receive the "best available" AKI and AK 10304. Optionally, these users may participate in an AKM interaction(s) to provide more information 10305 10306 such as photo type wanted, feature type wanted, local photo conditions, or other information to assist in determining and retrieving the "best available" AKI and AK for that need 10307. In some examples for each type and model of camera: If a point-and-shoot camera 8063 in FIG. 257 AKI suggests one or more "scene mode(s)" to use, along with how to turn it on/off in that camera model; AK provides explanation of that scene mode 8064 8065, plus related scene modes to try, optionally including one or a plurality of sample photos to illustrate a desirable result and/or provide a model of what to produce. If a DSLR 8067 AKI suggests correct camera settings for one or more photo type(s) 8068 along with how to turn that on/off in that camera model; AK explains that type of picture 8064 8065 and typical settings that produce good results, optionally including one or a plurality of sample photos to illustrate a desirable result and/or provide a model of what to produce. With any type of camera advertising 8065 and/or marketing 8065 may (optionally) be included with AKI/AK. If "Direct AKI" is available 8066, retrieve and deliver that in case the user wants to employ that to auto set the device without learning how to set the device manually.

Because the devices, situations, tasks and needs may change, the responsiveness and improvement of AKI and AK may make a difference for users. The testing of new or updated AKI/AK content from multiple sources begins as described above with the selection of a percentage of anonymous users 10302 and identified users who agree to participate in testing 10304. The content tested 10316 may come from multiple sources such as described in FIG. 2287701 through 7714 and elsewhere, and also in this figure as: Existing AKI, AK and other AK resources 10317; Camera vendors 10318; Camera users 10319; Other sources 10320 (such as photography authors such as reviewers, article writers, book authors, etc.; online photography communities; photography forums; etc.).

Those users and content are tested using AKM optimizations in automated and manual processes such as those described in FIGS. 228 through 231 and elsewhere, but in some examples include processes 10309 such as: Test type 1 User interactions (additional user information) 10310: In these tests users provide various types of additional information in AKM interactions, the results and outcomes are tracked and measured, and the appropriate type(s) of additional information (if any) is determined for providing the "best available" AKI and AK for that need; for this device and type of tests, types of additional information may include: User adds goal or task information 10311 like photo type wanted, feature type wanted, etc. User adds local photo conditions 10311 like outdoor/indoor, day/night, whether if outdoor, etc. Other user inputs are tried and tested 10311 to determine result(s) from utilizing that information to determine and retrieve "best available" AKI and AK for that need.

In some examples AKM optimizations may include processes such as Test type 2 Format of AKI 10312: Numerous formats for AKI and AK are possible; in these tests varying formats are tested with the results and outcomes tracked and measured so that the appropriate type(s) of formats are determined for providing V. "best available" AKI and AK for that need; for this device and type of tests, types of formats may include: Instructions such as a numbered list of steps 10313 with separate tests run for different presentations of them such as starting the list at the current step, starting the list at the beginning, etc.; Cue card(s) 10313; Hint(s) 10313; Tip(s) 10313; Task steps 10313 such as a brief list of steps with separate tests run for different presentations of them such as showing all of them with the current step highlighted, or listing only a few brief words for each step but allowing each to be expanded for more information, etc.; Direct AKI 10313 where the steps and instructions are performed for the user (if available); Other formats and options 10313.

Other types of tests 10314 10315: Other types of tests are described elsewhere, but may include in some examples comparative testing in which the current "best available" AKI and AK for that device (camera in some examples) model and need is continuously or periodically tested against the "top 3" or "top 5" additional information interactions, AKI formats, etc. from similar devices to determine the best outcomes; etc. Similarly as described in this figure and elsewhere (such as in FIGS. 228 through 234), continuous or periodic improvements are made in AKM testing methods 10309 10321 and AKM optimizations methods 10321.

The result of said AKI and AK tests 10309 and optimizations 10321 of content 10316 by users 10302 10304 is to be able to select and provide the "best available" AKI and AK 10304 10307.

AKM DOMAIN LEARNING FROM A DEVICE (DIGITAL PHOTOGRAPHY): FIG. 260 "AKM Domain Learning from a Device (Digital Camera)" illustrates domain learning, which is when a user has the goal of doing something in a new area and a device is part of that, the AKM can provide focused AKI/AK on how to use the device to achieve that user's goal. Domain learning is often complicated because it is larger then a device. In some examples good family photographs are a big issue to parents because they either must take a good picture right the first time or miss photographing these moments in their children's lives. Some examples include the only performance of a school play or concert, one of their child's only charges to kick a soccer goal during a team game, etc. Taking a good picture is what matters, not the device used to do it. For example, it doesn't matter to a parent whether he or she is using the cheapest entry-level point-and-shoot camera or the most expensive DSLR and lens. Either they get a good "in the moment" picture of their child or it was missed forever. In these situations, domain learning may include preparing or setting a device properly before an event occurs or an activity begins—even-if a user has never done that task before, or has done it but not with this device, or model, or conditions—to maximize the opportunity for success when the activity begins and the moment arrives. In this example the activity and domain are more important than the brand or model of a device, because it's helpful if any device is used correctly to succeed in the activity that the devices are used to perform.

Turning now to FIG. 260 new domain uses begin when a user wants to use a digital camera 10322 (of any type of this category of device, whether a point-and-shoot camera 10323 or a DSLR 10324) to take a new type of picture 10325—in this example, photographing a child performing on a lighted stage in front of a darkened audience as a participant in a school play or concert 10325. This is a complex photograph because most cameras are limited in what they can do easily under these conditions: Their lenses have small to somewhat small arpertures, their ISO capabilities are too low to capture low light photos, and their flashes are not powerful enough to illuminate the stage. A plurality of users will fail to take good pictures under these conditions because they won't know how to set their camera's controls or use it to take this type of picture successfully. In this case a user may make an AKM request 10326 by means such as the device 10326 or an AID/AOD 10326; or an AKM request may be triggered by a user fumbling with the controls 10327, by taking a blurred picture 10327, or any other in-camera warning or trigger 10327. If the user is (optionally) asked whether AKI/AK is wanted 10328 and the user chooses not to send the trigger 10328 then the user has the result 10329 of not knowing how to use the device to do this task (in this example using a camera to take a difficult type of picture), no AKI or AK, and the task of figuring out how to use the camera for this type of picture him/herself. If the user chooses to request AKI/AK 10328 then the user may (optionally) also choose whether to include additional data by means of an AKM interaction(s) 10330 such as including the last # of fumbled steps (if available) 10330, sending EXIF data only or EXIF data plus a sample photograph(s) 10330, or other AKM requested information 10330 such as described in FIG. 257 8058 8059, or determined by testing and optimization means such as described in FIG. 259 and elsewhere.

When the trigger is received by the AKM 10332 the trigger is parsed including the trigger (and whether it includes additional information such as EXIF data only or access data and a photograph, task, device, etc.); The AKI/AK access and retrieval process 10334 occurs as described here as well as elsewhere. If the trigger 10330 includes additional information the AKM may (optionally) analyze the trigger's additional information (such as a problem(s) such as a blur warning, a photo type by means of photo analysis, additional interactions information such as local photo conditions, etc.) then utilize these additional attributes to retrieve the appropriate AKI/AK 10334; but if additional information is not available then the trigger data alone is used to retrieve the appropriate AKI/AK 10334: If a point-and-shoot camera 10323 retrieved AKI suggests one or more "scene mode(s)" to use, along with how to turn it on/off in that camera model; AK provides explanation of that scene mode 10336 10337 plus related scene modes to try, optionally including one or a plurality of sample photos to illustrate a desirable result and/or provide a model of what to produce. If a DSLR 10324 retrieved AKI suggests correct camera settings for one or more photo type(s) 10340 (in this example such as without a flash or with a professional flash and zoom) and typical settings that produce good results along with how to turn that on/off in that camera model; AK explains that type of picture 10336 10337 and typical settings that produce good results, optionally including one or a plurality of sample photos to illustrate a desirable result and/or provide a model of what to produce. With any type of camera retrieved advertising 10337 and/or marketing 10337 may (optionally) be included with the AKI and/or the AK. If "Direct AKI" is available 10338, retrieve and deliver that in case the user wants to employ that to auto-set the device without learning how to set the device manually.

For delivery 10342, the AK resources retrieved 10332 10334 are combined with appropriate marketing information 10343 from AK sponsors and advertisers into a single message 10342, formatted for delivery based on attributes such as the content, media, device, etc.; and (optionally) fitted to identified users' preferences 10344 such as their preferred AIDs/AODs 10344 if they are currently in use. If said AKM message(s) 10342 is sent to the device 10322 it is used and (optionally) tracked and/or measured results are communicated and received 10345. If said AKM message 10342 is sent to the user's preferred AID/AOD 10344 it is used and (optionally) tracked and/or measured results are communicated and received 10345. Whether the AKI/AK are used in a device 10322 10323 10324 or in an AID/AOD 10344, results may be (optionally) tracked, measured, collected and stored 10345 by the AKM or by third-parties as described elsewhere. Aggregate AKI/AK results 10345 are used in multiple ways such as reporting to users to improve device use and selection (which creates market and customer pressure for vendors to make improved devices), and reporting to vendors to develop improved, optimized and transformed devices (cameras in this example) that provide higher rates of customer success and satisfaction.

AKM RECONCEPTUALIZATION OF DEVICES FROM AKM (DIGITAL PHOTOGRAPHY): FIG. 261 "Vendor Device Transformations (from AKM Use; Digital Camera Example)" illustrates a potential new stage in the evolution of current devices that is enabled by this AKM. By means of AKM usage and results data, device designers are able to connect the goals, tasks and activities of users; the AKM assistance they needed in order to succeed, and the types and magnitude of the gaps between customer intentions and current devices; with potential designs for future redesigns of that device. This enables transforming current devices by reconceptualizing them by means of the AKM's uses, in order to increase customer success and satisfaction—and thereby capture greater market share as well as improve those transformed devices.

Turning now to FIG. 261, AKM device transformations are illustrated by means of transforming today's digital cameras into multiple entirely new types of digital cameras. First the overall transformation process is illustrated 10348, then each stage is explained; in some examples the stages may be renamed; in some examples the stages may be reordered; in some examples a plurality of stages may be deleted; in some examples the stages may be adapted; in some examples new stages may be added to fit a device's evolution; or in some examples these alterations in the transformation process may be combined to fit particular needs or a specific situation. The AKM device transformation process 10348 includes: Stage 1 Learning 10349: As described elsewhere, the "best available" AKI/AK is determined by various testing mains, optimization means, etc. Stage 2 Delivery 10350: As also described elsewhere, various continuous improvement processes 10349 10350 10354 10358 may be used to deliver better AKI and AK 10350 that may increase areas such as the rates of success, satisfaction, product selection, etc. Stage 3 Transform devices 10351: As also described elsewhere, aggregate AKI/AK results are reported to vendors (which may include data such as goals, activities, tasks, needs, issues, gaps from successful achievement, AKI/AK delivered, resulting outcomes, other data and metrics, etc.) to reconceptualize and transform devices (digital cameras in this example). Stage 4 Sell and use transformed devices 10352: When improved devices go on sale and into use, restart Stage 1 learning but begin it at the highest achieved Stage 2 and Stage 3 levels so that improved devices begin a new round(s) of further improvements and successive transformations. See "AnthroTectonics" and FIG. 268 below, as well as other explanations, for additional description of substantial AKM transformed devices, systems, machines, methods, processes, etc.

A more detailed AKM device transformation of the digital camera, based on AKM uses by parents for family and children's pictures, might include: In Stage 1 and 210349 10350 10354 the AKM serves the current goal of improving family and children's photography 10358 by providing AKI/AK to the users of point-and-shoot cameras 10355, DSLR cameras 10356 and video cameras 10357 for all types of photography, recording and images of family events and activities 10358. Simultaneously and in parallel, in Stage 2 10350 AKM data is collected and delivered as optimized and "best available" AKI and AK to users to improve camera use 10354; and for customers and prospective buyers to make camera buying selections 10360 and purchase of the best available cameras for taking family and children's photographs; these selection data come from AKM data and resources on the most and least successful cameras for these tasks. In Stage 3 10351 vendors transform devices, and in Stage 4 10352 those transformed devices are sold and go into use; this occurs at the same time as Stages 1 and 2 and continuously over a long period of time—data from Stage 1 10349 and Stage 2 10350 is aggregated and delivered to vendors to transform camera designs 10361 10364; some examples of which may include: A new name—such as "FamCam" (family camera)—may be developed to differentiate this type of digital camera 10364 10365 10362. The basic capabilities of a FamCam may be modified, such as that it takes both still photos and videos that include sound and zooming (e.g., one full-featured device replaces both still and video cameras. Another basic FamCam capability may be lifecycle-based scene modes that fit families with kids: Choose the scene and appropriate AKI/AK for that type of photography flows to the user by the user's preferred channel(s) and media. Using a transformed camera could be simplified by using new family-based scene modes to choose what is being recorded, modes like "auditoriums (concerts and plays)," "classroom lighting," "freeze sports and action," "group photo," "indoor portrait," etc. These modes set the camera for taking various types of photographs and videos. In some examples this transformed camera might make its controls easier to find and switch to the right new "family scene mode" for each type of picture or video recording—with appropriate AKI/AK for each type of family photography. The device itself may be directly linked to and/or provide links to AKM/AK for lifecycle events 10368 and how to take the types of photographs and videos needed from each event type or activity 10368. These AKI/AK resources may be specific to each camera and model (and type of lens if a DSLR, such as for a telephoto zoom lens). Point-and-shoot camera AKI/AK may focus on choosing the right family-based scene modes, locating that control and setting it quickly, etc. DSLR cameras still have P/A/S/M modes but now also use either settings dials or menus with family-based choices and modes, and their AKI/AK includes both the new family scene modes and how to use the traditional P/A/S/M settings for each type of family photography. In either point-and-shoot or DSLR cameras the AKI and/or AK delivered may include interactive tips (such as "raise/lower ISO"), or the need to use an accessory (such as "use a tripod" or "how to turn on the flash").

When transformed devices such as a "FamCam" are available for sale 10362, users may still purchase old-style cameras 10363 that are only picture-focused or video-focused and use more complex, less relevant features and operations. Alternatively, users may choose a transformed device such as a "FamCam" 10362 whose features support greater customer success and satisfaction based on customers' goals and needs 10364. In addition to transformed devices 10351 10352 10361 10362 10365, vendors and/or third-parties can provide AKM services 10368 and accompanying marketing/advertising 10369 that fit each type of family lifecycle event or activity. These niche and/or general AKM services, with or without accompanying marketing and advertising, may be triggered in a plurality of ways as described elsewhere, such as by selecting a feature (such as new family-based scene modes) in a transformed device (such as a "FamCam").

The FamCam is only one of some examples of how today's point-and-shoot cameras 10355, DSLR's 10356 and video cameras 10357 might be transformed. Based upon customer uses and goals, other types of transformed cameras may evolve such as a "VacationCam", a "NatureCam", etc. 10366. If a transformed device requires unique capabilities (such as high shutter speeds or low light arpertures) then it may be a dedicated physical design, but if it does not then by vendor downloads (or by built-in storage) one type of transformed camera might be switched to another by reloading its settings and/or rebooting it 10366 as that new type of camera. Some examples might be switching a FamCam to a VacationCam when taking a trip, or switching it again to a NatureCam before going out to do wildlife and nature photography. Each type of multiple transformed device might be provided by a vendor or third-party as an additional (or included) plan, package, complete or partial service, etc. 10370 with multiple pricing options available so that the more types of devices and capabilities included (or downloaded) the higher the price. In addition, each of these types of devices (such as a FamCam, VacationCam, NatureCam, etc.) could provide the same types of AKM assistance as a FamCam: If a point-and-shoot camera 10323 in FIG. 260 retrieved AKI suggests one or more "scene mode(s)" to use, along with how to turn it on/off in that camera model; AK provides explanation of that scene mode 10336 10337 plus related scene modes to try. If a DSLR 10324 retrieved AKI suggests correct camera settings for one or more photo type(s) 10340 (in some examples such as without a flash or with a professional flash and zoom) and typical settings that produce good results along with how to turn that on/off in that camera model; AK explains that type of picture 10336 10337 and typical settings that produce good results. With any type of camera retrieved advertising 10337 and/or marketing 10337 may (optionally) be included with the AKI and/or the AK. If "Direct AKI" is available 10338, retrieve and deliver that in case the user wants to employ that to auto-set the device without learning how to set the device manually.

At the same time, (optional) marketing, advertisements, etc. 10369 may be provided that fit to each type of camera use, event or activity so that users are provided a complete wrap-around package of device(s), AKM interactions that deliver high rates of success and satisfaction, and purchase options appropriate for taking next steps that are available from vendors or third-parties, along with AKM data on the "best available" choices to reach the highest levels of success and satisfaction.

AKM VENDOR'S GOALS-BASED RECONCEPTUALIZED OFFERING(S) (VACATIONCAM): It is common for photographic hobbyists to spend thousands of dollars to go on a trip led by a professional photographer who takes them to scenic locations and shows them how to get "the shot" in each location. Because an expert told them how to set up their camera and compose the picture, the group of hobbyists on that trip are able to take great pictures—but at a high cost in both money and time. Imagine that at each place during a typical vacation this kind of expert instructions in "how to get a great shot" could be delivered by a camera, along with sample pictures as part of the instructions. Then a plurality of camera users could routinely take great pictures, potentially making every vacation into a photographic expedition where large numbers of travelers can show off the genuinely great photographs that they took themselves. In some examples, imagine if how to get "the shot" were part of using a camera in a plurality of locations where cameras are used.

Just as the creation of one electronic online purchase evolved into e-commerce that became a widely available option for selling and buying, the creation of an Alternate Reality that includes Teleportals and the AKM might evolve into an option that is considered a normal choice for succeeding when deciding which product to buy, or using a plurality of devices. The use of a camera on a vacation is just one of some examples because a vacation takes a device (camera) user into new places and situations a user has never seen before, with often unexpected and changing conditions, which makes taking good pictures difficult. Similarly, in some examples a plurality of people have goals that require them to try new tasks with various devices in situations they have never seen before, and when in a task that device might provide the equivalent of "how to get the shot," optionally including one or a plurality of pictorial examples, to make it possible to perform better than if this were not available.

Turning now to FIG. 262 "Selling/Using a 'Goals Package' (VacationCam)" provides a representative use of an AKM transformed device(s). In some examples FIG. 262 provides a life cycle view of some digital photography usage wherein one or multiple companies sell and provide a device that may utilize the AKM to support customer success. The top row 10372 provides the lifecycle Stage 10372, the Process employed at that stage 10372, and the AKM/AK Resources 10372 utilized at that stage—which are generally described in greater detail elsewhere. The left Stage column 10372 provides multiple life cycle stages (which may optionally include more or fewer stages depending on how a lifecycle is defined) that include Sale 10373, Setup 10383, Use/AKM support 10387, and Related services/Steps 10412. In somewhat more detail each of these stages 10373 10383 10387 10412 may include processes, steps and/or AKM resources that are described here but are often described in more detail elsewhere:

In the Sale stage 10373 either the device or AKM service is sold or added to an existing user's current AKM record(s) 10374 10378. The device is a VacationCam 10377, or if the user already owns an appropriate camera then a VacationCam AKM configuration and service may be the "product" sold 10377, or if the user already has an AKM account that provides this service then the addition of this trip itinerary may be the service that is either sold 10377 or provided at no charge 10377, or if there is any other type of relationship (such as a customer who books a trip and adds their travel activities to their own AKM account) then that may be included 10374 10377. In any case 10374, the "agent" who adds a device 10377, service 10377, etc. 10377 may include: Vendor 10375; Travel agent 10375; Destination resort, hotel, motel, etc. 10375; Cruise ship 10375; Local store at any vacation spot 10375; Customer 10376; The AKM or any third-party that helps with or manages the user's AKM account(s) 10375; The vendor of the device (such as a camera manufacturer) if that vendor also includes AKM services with the device, or sells them as an ad-on to the device 10375; A vendor of an AID(s)/AOD(s) (such as a cellular communications or other communications vendor) who provides AKM assistance to a plurality of devices as a service on their network by means of the AID(s)/AOD(s) that they sell 10375; A third-party who provides various types of AKM assistance by means of a device(s) and/or AID(s)/AOD(s) 10375; Etc. 10374 10375 10376.

When the device or service is provided 10374 the "agent": If the customer is buying a device (VacationCam in some examples) and does not have an AKM account or user AKM record(s), then the "agent" sets these up 10378, including associating the device (by means such as a device ID, vendor and model number, etc.) 10382 with that account 10378 10379. If the customer already has an AKM record(s) then the agent associates the new VacationCam with said AKM record (s) 10378, or if the customer already has an appropriate camera then the agent associates the customer's camera with said AKM record(s) 10378, including associating the device (by means such as a device ID, vendor and model number, etc.) 10382 with that account 10378 10379. If a new device (VacationCam in some examples) includes pre-paid AKM support then it already includes its own AKM account and may be set up and used without being associated with an identified user's AKM record(s) 10378 10379, but may (optionally within that ID'd device's prepaid AKM service) include goal selection 10379 and/or device configuration 10380 (such as by copying a "best goal" record from AK resources 10380 10410).

After account set up 10378 and/or association 10378 the device model (such as a VacationCam) 10379 and goals selection (such as vacation pictures and/or videos) 10379 is performed. Also performed is the configuration of these goals for that device 10380, such as by copying a "best goal" record from AK resources 10380 10410. If a new device is being provided to the customer (VacationCam in some examples) then the device is either shipped 10382 (such as from a travel agent) or given to the customer 10382 (such as in a local store or on a cruise ship), and said device's ID is included in the device selection 10379, goal selection 10379, and user AKM record(s)/device configuration 10380.

In the Setup stage 10383 the customer's trip activities (optional), itinerary (optional), etc. are input 10384 into the appropriate AKM record(s) 10381 (if the user has an identified AKM record(s)), the device 10381 (if the device [VacationCam in some examples] includes prepaid or no charge AKM support), etc. this is (optionally) input by the appropriate agent which may include: Vendor 10384; Travel agent 10384; Destination resort, hotel, motel, etc. 10384; Cruise ship 10384; Local store at any vacation spot 10384; Customer 10384; The AKM or any third-party that helps with or manages the user's AKM account(s) 10384; The vendor of the device (such as a camera manufacturer) if that vendor also includes AKM services with the device, or sells them as an ad-on to the device 10384; A vendor of an AID(s)/AOD(s) (such as a cellular communications or other communications vendor) who provides AKM assistance to a plurality of devices as a service on their network by means of the AID(s)/AOD(s) that they sell 10384; A third-party who provides various types of AKM assistance by means of a device(s) and/or AID(s)/AOD(s) 10384; Etc. 10384.

If input by activity 10384 these may be related by the AKM to the VacationCam's appropriate scene modes 10388 10410

(if a point-and-shoot camera) or settings 10388 10410 (if a DSLR), etc. and match them to that vacation's activity descriptions such as: At the beach 10384 (with AKI/AK for both full sun beach or water, and overcast beach or water); Outdoor daytime tour stops 10384 (with AKI/AK for both full sun daytime outdoor activities/overcast daytime outdoor activities); Indoor daytime tour stops 10384 (with AKI/AK for indoor activities such as a museum or church/indoor activities such as a play, theater or concert); Indoors such as a restaurant, hotel, etc. 10384; Outdoor night activities 10384 (with AKI/AK for both full moon nights/cloudy or dark nights); Daytime landscapes 10384 (with AKI/AK for both full sun pictures and overcast or cloudy pictures); Daytime close-ups such as flowers or plants 10384 (with AKI/AK for both full sun pictures and overcast pictures); Etc.

To do the above setup steps, similar "bundles" of AKM VacationCam options (such as a VacationCam model 10379, goals 10379, user AKM record(s) configuration 10380, device configuration, with "best goals" record) may be pre-setup and stored in AKM resources 10410 for access and (perhaps even one-step) configuration of an entire vacation. Some examples include: Caribbean island vacation; Caribbean cruise; Amazon rainforest vacation; Widlife safari (Africa, Asia, etc.); Major city by day/Major city at night (New York, Paris, London, etc.); Alaska inside passage cruise; Alaska parks tour (such as Denali); RV vacation (select season such as winter or summer); U.S. national parks overnight camping (select season such as winter or summer); Islands cruise and/or islands vacation (Greece, Galapagos, South Pacific, etc.); Etc.

A prepaid, preconfigured device 10377 10384 10385 (VacationCam in some examples) sold at destinations may already include AKM options such as an ID 10382, goal selection 10379, device and/or a location-based or trip-based configuration 10380, etc. such that said device 10385 is ready to be handed to said customer for use with the AKM for that location or type of trip. This is the equivalent of any device designed for use in a focused application or by a focused audience, but in some examples it is a disposable camera that includes multiple settings for various types of higher quality photographs, along with AKM support for taking successful photographs under that vacation destination's conditions.

Also in this Setup stage 10383 a customer receives the device 10385 either by having it shipped 10382 (such as from a travel agent, an online vendor, etc.) or by having the device given directly 10382 (such as from a retail store before a trip, a local store during a trip, onboard a cruise ship, at a destination resort, etc.). If the device (VacationCam in some examples) is not configured, then the customer can connect it online and receive the VacationCam AKM configuration and resources 10385 by means of authentication and authorization 10412, retrieval of the trip's activities or itinerary from the user's AKM record(s) 10381, retrieval of those data from AK resources 10410, and downloading said data to said device 10410 10385. If the customer already owns an appropriate camera 10379 that has been associated with this trip 10378 10380 10384 10381, then that customer may connect that camera online and receive that trip's AKM configuration and resources 10385 by means described above 10412 10381 10410 10385.

Also in this stage the customer receives AK "how-to" guidance 10385 that is either itinerary-based 10385 (such as Day 2—At the beach, Sailing yacht cruise (includes on-deck dinner during sunset: At the beach or on the water in full sun; At the beach or on the water if overcast; sunset pictures), activity-based 10385 (such as Day 3—City tour: Outdoor tour stops with wide-angle street shots in full sun or overcast; Indoor daytime tour stops including museums and churches), etc. To the extent that a traveler is interested, these AK how-to camera settings can be used to prepare the device (VacationCam in some examples) at appropriate times, such as the start of each different type of activity during each day of the trip.

In the Use/AKM support stage 10387 the device (VacationCam in some examples) is used to take pictures during each activity while on the trip 10388. While most of this process has been described elsewhere, this figure provides means to describe navigation to device configurations and downloaded AKI/AK 10388. As illustrated herein, navigation can be provided by means of an itinerary, timeline, calendar, or other time-based or sequence-based displays, illustrated in this figure as an itinerary/schedule/sequenced list of activities/timeline/etc. 10389 10392 10395 10398 10401 10404. In the configured device 10385 (VacationCam in some examples) these AKM resources 10384 10381 10410, which may be located remotely or downloaded to local storage in the device or in an AID/AOD, may be accessed by multiple known navigation means (such as menus, lists of links, navigation bars, navigation widgets such as dropdown lists and pull downs, search boxes, tables, graphics, icons, images, etc.) so that other varied AKM configured device navigation examples, designs and layouts that incorporate the examples may be integrated into this and other devices, services or interactive processes. This provides means for navigating directly to AKM resources (whether those resources are located remotely or downloaded to local storage in the device or in an AID/AOD) for a configured device; or means for navigating to AKM resources based upon problems or issues that occur during use of said device.

Navigation to this device's configured AK/AKI/AKM resources (herein abbreviated as "AK/I") is provided as an itinerary/schedule/sequenced list of activities/timeline/etc. 10389 10392 10395 10398 10401 10404 (though it could employ other navigation means, designs, layouts, etc.). Simultaneously, navigation to this configured device's AK/AKI is provided by means of triggers that occur due to user needs, issues, problems, desires, etc. when using the device (to take pictures with the VacationCam in some examples) so that:

Day 1—Travel 10389: If configured AK/I is needed navigation to AK/I may be by a list that may be sorted by a selector such as an alphabetical list like "Activity, Itinerary, Schedule" so that this item is displayed in the correct place in each list (such as "Day 1: Travel" in Itinerary, "Travel (Day 1) in Activity, etc.)>If there is an issue or unmet need in using the device during this activity 10390, then additional AKI/AK may be accessed interactively 10391.

Day 1—Resort 10392: If configured AK/I is needed navigation to AK/I may be by a list that may be sorted by a selector such as an alphabetical list like "Activity, Itinerary, Schedule" so that this item is displayed in the correct place in each list (such as "Day 1: Resort" in Itinerary, "Resort (Day 1) in Activity, etc.)>If there is an issue or unmet need in using the device during this activity 10393, then additional AKI/AK may be accessed interactively 10394.

Day 1—City tour 10395: If configured AK/I is needed navigation to AK/I may be by a list that may be sorted by a selector such as an alphabetical list like "Activity, Itinerary, Schedule" so that this item is displayed in the correct place in each list (such as "Day 1: City tour" in Itinerary, "City Tour (Day 1) in Activity, etc.)>If there is an issue or unmet need in using the device during this activity 10396, then additional AKI/AK may be accessed interactively 10397.

Day 2—Beach 10398: If configured AK/I is needed navigation to AK/I may be by a list that may be sorted by a selector such as an alphabetical list like "Activity, Itinerary, Schedule" so that this item is displayed in the correct place in each list (such as "Day 2: Beach" in Itinerary, "Beach (Day 2) in Activity, etc.)>If there is an issue or unmet need in using the device during this activity 10399, then additional AKI/AK may be accessed interactively 10400.

Day 2—Cruise at sunset 10401: If configured AK/I is needed navigation to AK/I may be by a list that may be sorted by a selector such as an alphabetical list like "Activity, Itinerary, Schedule" so that this item is displayed in the correct place in each list (such as "Day 2: Cruise at sunset" in Itinerary, "Cruise at sunset (Day 2) in Activity, etc.)>If there is an issue or unmet need in using the device during this activity 10402, then additional AKI/AK may be accessed interactively 10403.

Day 3—Museum 10404: If configured AK/I is needed navigation to AK/I may be by a list that may be sorted by a selector such as an alphabetical list like "Activity, Itinerary, Schedule" so that this item is displayed in the correct place in each list (such as "Day 3: Museum" in Itinerary, "Museum (Day 3) in Activity, etc.)>If there is an issue or unmet need in using the device during this activity 10405, then additional AKI/AK may be accessed interactively 10406.

Day X—Other activities including new and unscheduled activities 10407: If new AK/I is needed navigation may be by a list that may be sorted by a selector such as an alphabetical list like "Activity, Itinerary, Schedule" so that one of the items displayed in each list includes means to add activities (such as "Add a new activity" in Activity, "Add a new activity" in Schedule, etc.)>If there is an issue or unmet need in using the device during this new activity 10408, then additional AKI/AK may be accessed interactively 10409.

The AKI/AK needed in each instance 10391 10394 10397 10400 10403 10406 10409 is provided by means described elsewhere, but is described here by means of (optionally) authenticating and authorizing said request 10412, retrieval of the AKI and/or AK needed by means of the user's AKM record(s) 10381 and/or directly from AK resources 10410, along with any appropriate advertisements and/or marketing information 10411, and downloading said AKI/AK to said device 10389 10392 10395 10398 10401 10404 10407.

Undertaking new and different activities 10407 may occur without preparation and interactively 10407 when issues occur 10408 to access AKM resources 10412 10410 10411 and provide the appropriate AKI/AK 10409 whenever needed. Alternatively, if the travel schedule, plans and/or activities are changed at any time 10407, even during a trip, these changes may be entered 10384 in the user's AKM record(s) 10381, the device reconfigured 10385 10412 10410 (the VacationCam in some examples), and the new and updated configuration utilized by the device during use 10387 for the new schedule 10388 and its updated individual activities 10407 10389 10392 10395 10398 10401 10404.

Alternatively, local device storage and access to AKM resources may be provided when the device (VacationCam in some examples) is configured 10385. AKI and/or AK for the activities or itinerary entered 10384 in the user's AKM record (s) 10381 may be retrieved, downloaded and stored 10385 10412 10410 (if the device has sufficient local storage) when the device is configured online. If the device has sufficient storage and ability to process AKM requests locally then it may be configured for local access and display of locally stored AKM resources, and during use these may or may not be identified as being provided by an AKM (in some examples when they are presented as being a feature of the device itself, from the device manufacturer, branded so they appear to be from a third-party such as a cruise line or travel agency, etc.) such as:

Day 1—Travel 10389: If configured AK/I is needed navigation to AK/I stored in the device may be by a list that may be sorted by a selector such as an alphabetical list like "Activity, Itinerary, Schedule" so that this item is displayed in the correct place in each list (such as "Day 1: Travel" in Itinerary, "Travel (Day 1) in Activity, etc.)>If there is an issue or unmet need in using the device during this activity 10390, then additional AKI/AK may be accessed interactively 10391.

Day 1—Resort 10392: If configured AK/I is needed navigation to AK/I stored in the device may be by a list that may be sorted by a selector such as an alphabetical list like "Activity, Itinerary, Schedule" so that this item is displayed in the correct place in each list (such as "Day 1: Resort" in Itinerary, "Resort (Day 1) in Activity, etc.)>If there is an issue or unmet need in using the device during this activity 10393, then additional AKI/AK may be accessed interactively 10394.

Day 1—City tour 10395: If configured AK/I is needed navigation to AK/I stored in the device may be by a list that may be sorted by a selector such as an alphabetical list like "Activity, Itinerary, Schedule" so that this item is displayed in the correct place in each list (such as "Day 1: City tour" in Itinerary, "City Tour (Day 1) in Activity, etc.)>If there is an issue or unmet need in using the device during this activity 10396, then additional AKI/AK may be accessed interactively 10397.

Day 2—Beach 10398: If configured AK/I is needed navigation to AK/I stored in the device may be by a list that may be sorted by a selector such as an alphabetical list like "Activity, Itinerary, Schedule" so that this item is displayed in the correct place in each list (such as "Day 2: Beach" in Itinerary, "Beach (Day 2) in Activity, etc.)>If there is an issue or unmet need in using the device during this activity 10399, then additional AKI/AK may be accessed interactively 10400.

Day 2—Cruise at sunset 10401: If configured AK/I is needed navigation to AK/I stored in the device may be by a list that may be sorted by a selector such as an alphabetical list like "Activity, Itinerary, Schedule" so that this item is displayed in the correct place in each list (such as "Day 2: Cruise at sunset" in Itinerary, "Cruise at sunset (Day 2) in Activity, etc.)>If there is an issue or unmet need in using the device during this activity 10402, then additional AKI/AK may be accessed interactively 10403.

Day 3—Museum 10404: If configured AK/I is needed navigation to AK/I stored in the device may be by a list that may be sorted by a selector such as an alphabetical list like "Activity, Itinerary, Schedule" so that this item is displayed in the correct place in each list (such as "Day 3: Museum" in Itinerary, "Museum (Day 3) in Activity, etc.)>If there is an issue or unmet need in using the device during this activity 10405, then additional AKI/AK may be accessed interactively 10406.

Day X—Activity name: Other activities including new and unscheduled activities 10407: If new AK/I is needed navigation may be by a list that may be sorted by a selector such as an alphabetical list like "Activity, Itinerary, Schedule" so that one of the items displayed in each list includes means to add activities (such as "Add a new activity" in Activity, "Add a new activity" in Schedule, etc.)>If there is an issue or unmet need in using the device during this new activity 10408, then additional AKI/AK may be accessed interactively 10409.

Similarly, local storage and access to AKM resources may be provided by means of an AID/AOD 10385 that can be added when the device (VacationCam in some examples) is configured 10385. AKI and/or AK for the activities or itinerary entered 10384 in the user's AKM record(s) 10381 may be retrieved, downloaded and stored in the AID/AOD 10385 10412 10410 (if the AID/AOD has sufficient local storage) when the device is configured online. If the AID/AOD has sufficient storage and ability to process AKM requests locally then it may be configured for local access and display of locally stored AKM resources, and during their use these may or may not be identified as being provided by an AKM (in some examples when they are presented as being a feature of the device itself, from the device manufacturer, branded so they appear to be from a third-party such as a cruise line or travel agency, etc.).

The Use/AKM support stage 10387 may (optionally) include "Direct AKI" (which is described elsewhere) that is either accessed online 10389 10412 10410 or downloaded and stored in the camera 10385 10412 10410. In either case the "Direct AKI" may be chosen by the user at the appropriate time to set the camera before each activity 10389 10392 10395 10398 10401 10404. This process includes: Display configured AKM/AK/AKI navigation 10388 (such as by means of an itinerary, timeline, calendar, or other time-based or sequence-based displays, lists, navigation bars, navigation widgets such as dropdown lists and pull downs, search boxes, etc.). Select a navigation item 10389 10392 10395 10398 10401 10404 (such as an activity or itinerary item in this VacationCam in some examples). Select the type of AKM resource wanted (such as AKI, AK video, AK illustration, "Direct AKI", etc.). Alternatively, display AKI received from an issue during use, such as 10389 10390 10391 10412 10410. If "Direct AKI" is chosen, whether from a device's configured AKM resources or from an issue during use, the device is configured by said Direct AKI, then the user sees a confirmation message that the device (i.e., camera in some examples) is set to take pictures at <name of that activity> (such as "The camera is set to take beach pictures under full sun").

In the Related services/Next steps stage 10413 various types of information can be provided along with AKI/AK (as described elsewhere) and one category of these is AKM advertisements and marketing information 10411, which may be (optionally) accessed and delivered along with AKM resources 10410 either via a device or an AID/AOD. These advertisements and marketing information can provide a range of useful functions that are not part of the device 10377 during use 10388 but can offer ways to extend and expand what the device provides from its direct use. These may vary from device to device, as well as for different types of uses of one configured device (such as a VacationCam versus a PortraitCam, NatureCam, etc.). In some examples (VacationCam in some examples) related services and next steps 10413 10414 may include a plurality of offerings or services which in some examples may include:

Trip blog or travel blog services 10414: Various kinds of trip blogs or travel blogs may be offered such as an itinerary-based trip history (such as a new posting each day), a city or location-based record (such as a new posting from each place visited), activity-based postings (such as a zip-line adventure in a rain forest), picture-based postings (such as a travel photographer's blog), etc. This can be provided as a self-service blog where the customer opens an account, chooses a layout, then fills in all the structure and labels. Alternatively, this can be provided as a pre-designed blog that accesses the customer's itinerary or travel schedule from a source such as the AKM 10384 10381 to provide a ready-made container based on the customer's itinerary, activities, destination cities, etc.

Picture sharing services 10414: These may include a range of offerings such as photo sharing websites, online e-mailing of pictures to close family and friends, tweets with pictures attached, uploading pictures to social websites such as Facebook, etc.)

Picture printing services 10414: These may include traditional size small prints of individual photographs, framed prints, photo "books", canvas "paintings" (such as pictures that are enhanced with painter's styles and printed on canvas then mounted and framed, etc.

Accessories 10414: Accessories may include a wide range of items that display pictures or have pictures printed on them such as digital photo frames, T-shirts, mugs, souvenirs, etc.

Related devices 10414: These may include other adaptations of a device through various means such as downloaded configurations (VacationCam in some examples) such as turning a VacationCam into a FamCam, NatureCam, PortraitCam, or an OtherCam, etc.), Etc.

AKM DEVICE COMMUNICATIONS (DIGITAL PHOTOGRAPHY): Turning now to FIG. 263, the types of digital cameras discussed provide an appropriate device to illustrate the potentials for AKM communications by means of AKI, additional AK, etc. Said digital camera device 10416 includes a digital camera(s) 10417 and digital camcorder(s) 10418. In addition, a range of multi-function devices are emerging that include both still photography and video cameras 10426, which are represented in some examples by a smart phone 10427 in which various types of photography and video recording have been reduced from devices to built-in applications. In general, certain types of common features enable AKM communications in digital photographic devices 10416 10417 10418, emerging multi-function devices 10426, and/or AIDs/AODs 10426 10427. These examples of devices include: A screen 10420 10428 such as the LCD screens; A microphone and speakers 10421 10429 to receive information and to interact with the device (such as with voice commands); Controls and/or touchscreen 10422 10430 to interact with the device; Wi-Fi and/or other two-way communications 10423 10431; Applications that provide various functions such as sending stored content, etc. 10424 10432; Microprocessor and local storage 10425 10434.

These and other similar types of devices may be integrated with various types of networks (such as a hotspot network, cell phone network, local Wi-Fi networks, etc.). These components, functions and communications capabilities provide means that enable AKM interactions such as: The screen 10420 10428, microphone 10421 10429, speakers 10421 10429, etc. display or play AKI that is in any type of multiple media such as one or more of text, picture(s), video(s), audio instructions, interactive demonstrations, or any other media type or combination. AKI may include links to additional AK, advertisements, marketing information, etc. that may be navigated to or displayed by means such as display in any text or media 10420 10428, audio playback from a speaker(s) 10421 10429, voice commands via a microphone 10421 10429, touching the screen 10422 10430, pointing and clicking 10422 10430, using a four-way control to scroll and press an OK button 10422 10430, or by any other two-way communication/navigation means, such that when used either previously downloaded AK 10423 10431 may be displayed or played, or that item may be downloaded 10423 10431 for either playing, storage 10425 10434 or both. Interactive displays 10420 10421 10422 10428 10429 10430 may provide recorded and/or user-controlled interactive demonstrations such as zooming from a full device view to a control to show its location, then showing how that control is turned or manipulated to place it in the proper setting for that step. AKI and/or AK may also be provided in any type of media, or combination of multiple media, such as text, pictures, video, interactive click-through demonstrations that show the actual process occurring pictorially, etc. With a microphone and local processing present 10421 10425 10429 10434, voice commands may be used to initiate requests and/or interact with AKI and/or AK. In addition to various types of triggers described elsewhere, AKM requests may be initiated by means such as voice commands 10421 10429, a touchscreen or controls 10420 10422 10428 10430, two-way communications 10423 10431, etc. When AKI has been received and it includes additional AK, advertisements, marketing information, other types of information, etc. it may be branched to by any of the navigation, command, interaction, etc. means described herein. Additional AKI (such as "next steps"), AK, advertisements, etc. may have either links to these have been downloaded 10423 10431, or these items' content have been previously downloaded and stored 10425 10434. Capabilities are present in some of these devices 10416 10426 for additional media and/or communications such as IM (Instant Messaging), chat, voice calls, hypertext/hypermedia, etc. that may be provided by means such as a display screen with graphical user interface 10420, camera (which may be adapted for live video use) 10417 10418, microphone and speakers 10421 10429, controls and/or touch screen 10422 10430 (which may include an on-screen keyboard), applications 10424 10432 (such as an IM application), etc. Control the playback of any AKM-provided media or content by means such as on screen 10420 10428 or physical controls 10422 10430 for each media type. Navigate by means of links, menus, etc.; Etc.

Like the types of cameras illustrated in this FIG. 10416 10417 10418 10426 10427, a plurality of other devices (such as an AID/AOD, PDA [Personal Digital Assistant], Netbook, Internet tablet, or other emerging or future devices that include a plurality of communications features) 10426 10427 may employ the AKM in similar ways as the devices in ways described above 10416 10426 and throughout. In addition, devices that have two-way communications and other input means (such as a digital camera lens and visual system, various types of wearable displays/cameras such as a head-mounted configuration) may be employed in other ways such as described elsewhere; some examples include FIGS. 209-214 which describes various types of communications that utilize a range of devices, and FIG. 215 which describes various types of video and media inputs from communications devices that include camera systems or applications. As part of their AKM two-way communications these current, emerging and future devices may employ multiple media, combinations of media types, and/or types of media yet to be invented such as text, audio, video, two-way interactive media (with varied user controls such as zooming, linking, jumping to new steps or areas, opening related AK, etc.) demonstrations, chat, instant messaging, voice calls, hypertext, hypermedia, demonstrations, combinations of media types (such as text instructions with illustrations that are embedded. Zoomable and interactive;) videos, audio instructions, two-way interactions, 3-D, video controls such as play/pause/stop/etc., visual controls such as zooming/rotating/etc., embedded navigation, direct navigation, eyewear displays, display projections, etc., or other media types yet to be devised such as a projected wall display with touch controls embedded in the displayed image(s).

SOME AKM GOVERNANCES EXAMPLES—TOP-DOWN PROCESSES: TRANSFORMED COLLECTIVE DEVICES USE, TRANSFORMED COLLECTIVE EVOLUTION, TRANSFORMED COLLECTIVE SUCCESSES ("ANTHROTECTONICS"): FIGS. 264, 265 and 266 disclose some examples of transformational governances that include transformed goals, devices, systems, components, modules, applications, processes, methods, services, etc. (as described in FIGS. 255 through 263).

SOME AKM CORPORATISM GOVERNANCE EXAMPLES ("UPWARD MOBILITY INTO LUXURY LIFESTYLE PLAN"): FIG. 264 "AKM CorporatISM Governance Summary" provides some governance examples illustrated in FIG. 265 "AKM CorporatISM Governance Example (Upward Mobility to Lifetime Luxury Plan)" and in FIG. 266 "AKM IndividualISM Governance Example (one or more competing 'Customer Control, Inc.')." In FIG. 264, a governance 10440 is illustrated by the process that begins at the top left and then moves toward the top right. Its results-driven management decision making 10448 is built-in continuous improvement based on the collective benefits delivered, which begins at the bottom right and moves toward the bottom left. Together, these produce both initial sales 10442 and deliveries 10443 and increasingly successful AKM uses 10444 by its customers, with transformations produced over time due to the governance's aggregation of actual results from collective benefits delivered 10445 10446 and subsequent modifications 10447 10448 to the offering 10441 10442 and its components 10442 10443 10444 in multiple continuous iterative improvements. At this figure's high level, these governance transformations include: CorporatISM management and business operations 10441. Sales and marketing 10442 by the CorporatISM, distribution channel, retaileters, partners, affiliates, agents, OEM private label vendors, etc. Install devices and configure AKM 10443 which may be done by the CorporatISM; members of its distribution channel; or one or more of a plan's retailers, partners, affiliates, agents, OEM private label vendors, etc. Use devices with AKM, AKI and AK 10444 by said customers (or their family members) of the CorporatISM, distribution channel, retailers, partners, affiliates, agents, etc. Write the results of use(s) to the appropriate AK results database(s) 10446. Read those AK results database(s) to display reports and dashboards 10445 on individuals, groups, countries, local or larger regions, large customers such as a corporation's employees, etc.

Similarly, governance improvements 10447 are made by means of results-driven management decision making 10448 based upon visible results reported 10445. These continuous improvements and transformations 10447 are illustrated by the process 10448 that begins at the bottom right and moves toward the bottom left: Results-driven adjustments and improvements 10447 may be applied to each of these areas (management and business operations 10441, sales and marketing 10442, installation and configuration 0443, use with the AKM, AKI and AK 10444) based on the actual results received and displayed 10445 10446.

FIG. 265, "AKM CorporatISM Governance Example (Upward Mobility to Lifetime Luxury Plan)" illustrates the potentially larger scope of one or more competing CorporatISMs selling one or a plurality of robust AKM supported "packages" or "plans" as their sales and/or marketing offerings, whether as a retailer; wholesaler; OEM vendor for resale by other third-parties, affiliates, agents, etc.; distribution by nonprofit or charitable organizations, or any other sales or distribution channel that is legally permitted. In some examples for the first time an attractive line of homes, fully equipped with multiple appliances, comforts and types of AKM assistance to pursue multiple lifestyle and/or upward mobility career goals can be sold by multiple distributors who work with or work for one or more CorporatISMs. The price can be aggregated and packaged, such as in one monthly payment, by providing an "entire lifestyle package" or "combination package" (such as by combining upward mobility and luxury lifestyle packages) for a single affordable monthly payment that includes acquisition, moving in, installation and configuration, AKM assistance during use to achieve a higher rate of personal success, replacement as items break or wear out, etc. This allows a person, a family or a household to convert to a standard of living that is maintained for them for one monthly payment. Some examples of packages that may be combined and/or included could comprise: Upward Mobility Plan for those who want to raise their standard of living. Lifetime Luxury Plan for those who already earn enough to enjoy a lot. Retirement Security Plan for those who want to achieve a lifestyle they can afford during their retirement. Travel plan for those who want to include more travel in their lives. Or any other combination of devices, services, housing, transportation, education, entertainment, career success services, etc. that might be assembled and sold as a "package" or "plan".

Combination plans or packages may also be sold in some examples an "Upward Mobility to Lifetime Luxury Plan." These may include a plurality of material goods a person or a family needs such as a house or condominium with all appliances and various goods within it, from high-tech smart phones for communications and Internet to always-on wireless computing that the AKM makes easier to use, from AKI how-to instructions that assist with reaching personal and job goals to continuous AK resources in achieving them, etc. Broad plans and/or a la carte collections can be sold to individuals or familiaes, such as under one contract for one monthly payment or for one price that includes continuous AKM and support. Other broad plans and/or combinations of plans may be sold to corporations and/or groups to provide them a competitive edge in job and/or work performance, employee recruiting as a corporate benefit, government services to its citizens, benefits from a membership group (such as a religious organization, a professional or trade association, a senior citizens' organization, a lifestyle group, a residential community, etc.), etc. For those who already own their homes or other parts of a plan, there can be a la carte packages based on what they want to add, update and/or include.

Depending on the scope of a CorporatISM these may include a category(ies) of purchases such as financial (insurance, banking, investments), medical (health care, AKM guidance in areas like nutrition, etc.), food, appliances, clothing, furniture, etc. Once a person or family buys their package (s) they don't need to buy these goods and services elsewhere. Substitutions may be enabled such as wanting a larger or smaller clothes washer and having that swapped in for a service charge and small adjustment in a (monthly) fee. This allows a governance(s) to consider selling a higher standard of living to its members with one-stop satisfaction to provide a varying plurality of the needs of an individual, family or household. If something goes wrong, if something different is wanted, etc., automated AKM interactions could provide ways to take steps for the user to fix it during use or have it repaired or replaced at no charge. If a charge is required, the item can be repaired or replaced for a small charge if part of a plan or, optionally, an upgrade might be provided for the difference between the value of the current and replacement item(s).

The types of plans in some examples of a CorporatISM might attract the young and those who desire upward mobility, because they are in the starting stages of having to buy housing and all the goods and services needed for their preferred lifestyle. Or these types of plans might attract retirees who are moving from a decades-long house to a new state, a new house and a new retirement lifestyle. Instead of buying one expensive item at a time, and instead of working long years to acquire the level of possessions required for a desired lifestyle, a plurality of needs can be met with one purchase, and the new level of their lifestyle can be paid for with a monthly fee that can be set at a level they can afford—with money left to afford to live well. Since they (optionally) receive AKM "upward mobility support" that includes AKI and AK to assist with their job performance, career, financial management, wealth building, etc., those who are working can raise their job success, income and purchasing power to keep expanding the quantity and quality of their lifestyle plan(s). In some examples if a customer wants to move to another city, country, larger house, etc., they may be able to exchange their house with any other available from a vendor or affiliate of that CorporatISM, at the then prevailing assessed housing value and monetary exchange rates. If their new house is more luxurious they might increase the size of their (monthly or other) payment. If they reduce their house size or possessions they pay less. A new type of CorporatISM could give its customers increased mobility and liquidity with a standard of living that provides greater abundance and greater freedom from gradually fulfilling their material needs. This may be the equivalent of greater prosperity and comfort, with less struggle, than other periods of history—most of which has focused on maintaining the status quo politically at relatively poor levels of individual human welfare and financial security—instead of the AKM's and governances' continuous transformations to achieve and measurably deliver humanity's continually expanding goals, needs, wants and desires.

Turning now to FIG. 265, "CorporatISM Governance example (Upward Mobility to Lifetime Luxury Plan)" provides some more examples of FIG. 264. This follows the same structure as FIG. 264 "AKM CorporatISM Governance Summary" wherein this governance's business operations 10450 10451 10460 10469 104765 10483 are illustrated by the process that begins at the top left and then moves toward the top right. Its results-driven management decision making 10491 10496 provides continuous improvements that begin at the bottom right and then move toward the bottom left. The first component area in some examples of CorporatISM includes management and business operations 10451, and each of these components are described in areas such as FIGS. 248, 249 and 250 and include activities such as those described elsewhere, or which may be implemented by other known means: Business management and operations 10452; Technology and business systems 10453 including AKM with AKI and/or AK; Business and finance 10454; Customers 10455; Self-controls 10456; Reporting and dashboards 10457; Etc. 10458:

Sales and marketing 10460 by the CorporatISM, distribution channel, retaileters, partners, affiliates, agents, etc. which include activities such as those described elsewhere, or which may be implemented by other known means: Individual plans and packages 10461; Combination plans and/or packages 10462; OEM plans and/or packages 10463 such as for private-label plans and/or packages that may be offered by others, such as by large "big box" retailers; Numerous types of promotions, sales, offers, discounts, etc. 10464; Affiliates' sales 10465; Distribution channel sales 10466; Etc. 10467.

Install devices and configure AKM 10469 which may be done by the CorporatISM; members of its distribution channel; or one or more of a plan's retailers, partners, affiliates, agents, OEM private label vendors, etc. which include activities such as those described elsewhere, or which may be implemented by other known means: Housing, automobiles, other major purchases, etc. 10470 including selecting houses and moving in, selecting an automobile(s) and starting to drive it, making other major purchases and enjoying using them, etc. A plan may include a plurality of devices 10471 such as any of those in a complete household, communications, business, entertainment, education, etc., so these may be shipped and received already configured, or they may be shipped on installed and then connected and configured after being received. Services may be opened as part of a plan 10472 such as bank accounts, insurance policies, credit cards, online services, travel services, etc. The AKM may be configured for all of the items in a plan 10473 including user AKM record(s), identified devices linked to said user's AKM record(s), identified services linked to said user's AKM record(s), etc. CorporatISM and AKM installations and configurations 10469 may also be done by shortcuts such as templates, scripts, one-step application to a group's AKM record(s), object inheritance, other types of mass settings or shortcuts, etc.; Etc. 10474.

Use devices with AKM, AKI and AK 10476 by said customers (or their family members) of the CorporatISM, including its distribution channel, retailers, partners, affiliates, agents, etc. which include activities such as those described elsewhere, or which may be added by other means: A Lifetime Luxury Plan 10477 could include high-quality, luxurious housing, wireless communications of various types, transportation, devices (as defined herein), financial services, etc. It may also include 10478 entertainment, recreation, travel, etc. For a plurality of these 10477 10478 it may include AKM support in some examples AKI during use, AK, etc. to assist with growth into additional uses, higher levels of success, satisfaction, etc. An Upward Mobility Plan 10479 could include AKM support during the performance of one's job, work, career, etc. with AKM interactive learning (such as AKI during tasks and AK to expand those task successes and related task performance) provided to expand job successes and enable upward career mobility. An Upward Mobility Plan 10480 could also include a range of financial services including wealth growth and management assistance, also with AKM interactions throughout, to help Plan customers achieve more financial success sooner. Etc. 10481.

Reports and dashboards 10483: The AKM results from being a customer and user of said Lifetime Luxury Plan 10477 10478 and Upward Mobility Plan 10479 10480 may be visibly displayed in reports and dashboards 10483 for individuals, groups, countries, larger regions, as well as in reports and/or dashboards for varied groups such as external audiences in some examples customers, prospects, members of competing governances, etc. 10488; and internal audiences in some examples a corporation's employees, partners, affiliates, distributors, retailers, agents, etc. 10488, etc. 10483, and these include reporting capabilities such as those described elsewhere, or which may be implemented by other known means: So that current and recent results are visible, both short-term reports 10484 and short-term dashboards 10485 would show current and/or recent results by reporting and dashboard means such as described elsewhere, as well as by other known reporting and/or dashboard means. So that results over longer periods of time (such as three years, five years, 10 years, etc.) are visible, both long-term reports 10486 and long-term dashboards 10487 would show longer-term results by reporting and dashboard means such as described elsewhere, as well as by other known reporting and/or dashboard means. These reports and dashboards 10484 10485 10486 10487 would be available to the CorporatISM's Plans' members 10488, prospects 10488, competitors' members who are being urged to switch to this vendor's plans 10488, and others who may be reviewing, evaluating, comparing, or making other uses of said plans and the components of these and other types of plans. Etc. 10489.

Results-driven adjustments and improvements 10491 10496 may be applied to each of these areas, based on the actual results achieved 10476, received and displayed 10483: Management and business operations 10492 10451: Any type of business decisions, operations, business relationships, business adjustments, reorganizations, cost cutting, new additions, promotions or discounts, plan offering changes, policy changes, sales and marketing offerings, product lines, product designs, installations or configurations, results reporting, adding/modifying/ending relationships with vendors, etc. may be edited, updated, added, deleted, etc. in order to achieve any business goal (such as increasing the rate of visible success delivered 10476 10483). Sales and marketing 10493 10460: Plans, packages and/or offerings may be adjusted (the mix of what is sold and delivered, the goal(s) promoted by each plan or offering, etc.), how they are sold may be changed (such as by means of direct sales, partners, distributors, retailers, affiliates, etc.), as well as the promotions and/or discounts offered to achieve any sales or marketing goal (such as increasing the units sold, revenue received, etc.). Installation and configuration 10494 10469: Creation and/or adjustments may be made to users' AKM record(s), device goals, AKM settings, etc. to achieve any installation, configuration and/or performance goal (such as increasing the rate of visible success delivered 10476 10483). Use with the AKM, AKI and AK 10495 10476: Numerous types of AKM, AKI and AK optimizations are described throughout and may be utilized to achieve any usage goal (such as increasing the rate of visible success delivered 10476 10483, etc.).

FIG. 266, "AKM IndividualISM Governance Example (one or more competing "Customer Control, Inc.)" illustrates the potentially larger scope of one or more competing IndividualISMs that provide membership, subscription, etc. in one or a plurality of robust AKM "packages" or "plans" that offer expanded self-control, individual sovereignty, self-governance, etc. as their offerings, whether as a retailer; wholesaler; OEM vendor for resale by other third-parties, affiliates, agents, etc.; distribution by nonprofit or charitable organizations, or any other type of organization that is legally permitted. In some examples for the first time new types of customer controlled, member controlled, etc. types of self-governance, personal sovereignty, or other types of individual benefits may be actively developed and offered by means such as direct commercial sale, or third-party sales by multiple distributors who work with or work for one or more IndividualISMs. As a commercial offering, the membership fee, subscription amount, price(s), etc. can be aggregated and packaged, such as in one monthly payment, by providing an "entire multiple independent identities package" or "combination identities and consumption package" (such as by combining multiple independent identities and one or more consumption packages) for a single affordable monthly payment that includes acquisition, set up, AKM guidance, products, services, services (financial, travel, etc.), entertainment, installation and configuration, AKM assistance during use to achieve a higher rate of personal success, replacement as items break or wear out, etc. This allows a person, a family or a household to convert to a level of personal freedom and independence that is maintained for them for one monthly payment. Some example of packages that may be combined and/or included could comprise: Multiple Identities (and/or Multiple Lifestyles) Plan for those who want to raise their standard of living by having multiple identities that each independently engage in activities that may earn money, own assets, build wealth, and operate as a separate legal entity that may be kept or sold as property—providing those individuals with more earning power than the current single physical identity with one job; or for those who want to expand the ways they enjoy life by having multiple identities that each enjoy a separate and different lifestyle(s), relationship(s), residence(s), living standard(s), etc. Personalized Consumption Plan for those who want to raise their level of satisfaction by buying from vendors that provide personalized products and services, organic foods, sustainable products, clothing, etc., with price discounts from group buying, with additional customization(s), interface(s), business relationships, etc. to streamline buying these personalized bundles of products, services, etc. Individualized Travel plan for those who want to include more travel to their types of destinations, such as adventure destinations (rafting the Grand Canyon, hiking Machu Picchu and the Inca trail, African safaris, Nepal and Everst, etc.), luxury destinations (spas, resorts, etc.), cruise voyages (Mediterranean, Alaska, Antarctica, etc.), active travel (wildlife photography, kayaking, bicycle trips, etc.), etc. Career and Wealth Growth Plans for those who want to drive the economic growth of their one or more identities Lifestyle Expansion Plans for those who want to try new ways to live for one or more of their (single or multiple) identities, such as trying and/or developing one or more personas, online or in-person social identities, relationships, sexuality, athletics, etc. Social Group(s) Memberships for those who want to exercise their options in areas like social networking, activities, sports, lifestyle preferences, etc. Modified copies of any other type of plans, packages, offerings, services, etc. that are offered by CorporatISMs, WordISMs, other types of governances, corporations, governments, etc. with whatever values, policies and individualistic focus that is adapted to make this appropriate for an IndividualISM's values, beliefs and members. Help Control Your IndividualISM's Management: Multiple methods and systems are available for members, customers and/or subscribers to be more or less involved in controlling their IndividualISM directly and/or indirectly, as described in FIG. 248 "IndividualISM—Personal Sovereignty; Decentralized Governance ("Governance 1 of many) ", elsewhere, and by any means known outside of it. In some examples one or more parts of an IndividualISM, or all of it, may be controlled by its members through direct democratic elections of managers and/or boards (such as a board of directors), representative democracy, open source-style committees that develop broadly approved management policies and/or standards, nonprofit organization-style boards with hired professional managers, volunteer managers from the membership, members' committees that oversee or assist managers, etc. Or any other combination of independence, self-governance, self-sovereignty, identities, lifestyles, relationships, product selection, services, housing, transportation, education, entertainment, career success services, etc. that might be assembled and delivered as a "package" or "plan".

Combination plans may also be sold such as some examples "Multiple Identities Plan" plus "Personalized Consumption Plan." Such a package may offer various types of multiple lifestyles identities combined with various packages of material goods a person or a family needs to enjoy its selected identities, from high-tech online identities that create and own independent businesses (such as a broadcast network that AR TPM may make possible to create, run and customers to use), personalized products and services that the AKM makes easier to use to enjoy one's lifestyles goals, etc. Broad plans and/or a la carte collections can be sold to individuals, families or households; in some examples under a contract for one monthly payment, at a price that includes AKM support for pursuing a plurality of simultaneous identities and lifestyles. Other broad plans and/or combinations of plans may be sold to corporations and/or groups to provide them a competitive edge in job and/or work performance by employees in multiple roles, employee recruiting as a corporate benefit, governance services for those who desire greater personal freedoms, benefits from a membership group (such as a professional or trade association, a senior citizens' organization, a lifestyle group, a residential community, a religious organization, etc.), etc. For those who already own some parts of what a plan includes, there may be a la carte packages based on what they want to add, update and/or include.

Because IndividualISMs are designed to foster self-governance, self-sovereignty, etc. an IndividualISM may provide ways to buy from, join groups from, or form other types of associations with and within one or more IndividualISMs or other types of governances, so that a wider range of options is provided than available from just one IndividualISM. "Freedom of substitutions" may also be an explicit business policy provided to members with some examples such as no contracts, no cancellation penalties, enabling add/drop a group (s), add/drop a plan(s), switch from one group to a different group(s), switch from one plan to a different plan(s), make substitutions within a plan(s), add/drop an identitiy(ies), switch from one identity to a different identity(ies)—and these may (optionally) be enabled for more than one IndividualISM such as from multiple IndividualISMs or multiple governances. These allow IndividualISM governances to deliver greater personal freedom and sovereignty to its members with one-stop satisfaction to provide a plurality of the personal, social and/or commercial needs of an individual, family or household. If something goes wrong or something different is wanted, IndividualISMs might provide "customer freedom" instead of the types of "customer lock in" that some forms of governance might prefer. In the event something is not right, automated AKM interactions could provide IndividualISM members with ways to fix it themselves, change it, replace it with a more desired substitute, remove it, and/or end a relationship. If available the item or association can be dropped, ended, replaced, or a substitute added without additional charge if part of a plan or (optionally) for a small fee, or an upgrade/reimbursement might be provided for the difference between the value of the current and replacement item (s).

The types of plans in some examples of an IndividualISM might attract those who want personalized choices in the short term, and flexibility in the long term, because they feel they would rather have what they want when they want it, and explore new options at any time, instead of a fixed range of fixed choices (even if it is broad) for a fixed period of time. In some examples these types of plans might attract people of any age who are moving from one relationship or lifestyle to another (such as from marriage to becoming single) because they are unsure what they want to choose and when. Or, it may attract those who enjoy new experiences and trying new things any time they might want them. Instead of committing to one package or plan, and instead of pursuing a stable if high-quality lifestyle, a plurality of new and changing needs can be met with one purchase, and the new level of variety and freedom in a personal lifestyle might be paid for with a monthly fee that can be set at a level they can afford—with money left to afford to live well. Since they (optionally) receive AKM "upward mobility support" that includes AKI and AK to assist with their (optional) multiple identities, job(s) performance, creating multiple incomes by their multiple identities, career(s), financial management, wealth building, etc., those who are working can raise their job(s) success, income and purchasing power to keep expanding the variety and types of lifestyle(s) that they explore.

In some examples if a customer or couple wants to add a second or third identity, second or third home and a variety of different types of lifestyles in two or more cities, an IndividualISM might be an appropriate choice for providing the multiple identities, material goods and associations for trying/developing/enjoying these varied lifestyles. An IndividualISM might help them balance their income and desires to maximize their happiness and satisfaction within the size of (monthly or other) payment that they can afford. If they reduce their lifestyle, such as from different lives in three cities to two, they pay less. A new type of IndividualISM could give its customers increased mobility, flexibility, self-governance, self-sovereignty, etc with greater freedoms for achieving their lives' goals. This may be the equivalent of greater prosperity and comfort, with less struggle, than other periods of history—most of which has focused on maintaining the status quo politically at relatively poor levels of individual human welfare and financial security—instead of the AKM's and governances' continuous transformations to achieve and measurably deliver humanity's continually expanding goals, needs, wants and desires.

Turning now to FIG. 266, "AKM IndividualISM Governance Example (one or more competing 'Customer Control, Inc.')" provides some more examples of FIG. 264 following the same structure as FIG. 264 "AKM CorporatISM Governance Summary" wherein the IndividualISM governance's operations 10540 10541 10550 10560 10566 10573 are illustrated by the process that begins at the top left and then moves toward the top right. Its results-driven management decision making 10581 10586 provides continuous improvements that begin at the bottom right and then move toward the bottom left. The first component area of some examples of IndividualISM includes management and business operations 10541, and each of these components are described in areas such as FIGS. 248, 249 and 250 and include activities such as those described elsewhere, or which may be implemented by other known means: Customer control systems 10542; Management and operations 10543; Technology and business systems 10544 including AKM with AKI and/or AK; Business and finance 10545; Product design 10546 to enable personalization, customization, etc. whether provided by the IndividualISM, business affiliates such as authorized third-party vendors, or any other legal means of providing personalized devices, products, services, etc.; Reporting and dashboards 10547; Etc. 10548.

Sales and marketing 10550 by the Individualism, distribution channel, retaileters, partners, affiliates, agents, social groups, social networks, etc. which include activities such as those described elsewhere, or which may be implemented by other known means: Individual plans and packages 10551; Combination plans and/or packages 10552; OEM plans and/or packages 10553 such as for private-label plans and/or packages that may be offered by others, such as by large "big box" retailers; Affiliates' sales 10554; Third-party sales 10555 such as by a plurality of legal distribution channels; Numerous types of social groups, social networks, membership organizations, any other type of communicators and agents (such as bloggers, microbloggers, promoters, etc.), etc. 10556; Etc. 10557.

Install devices and configure AKM 10560 which may be done by the IndividualISM; members of its distribution channel; or one or more of a plan's retailers, partners, affiliates, agents, OEM private label vendors, social groups, social networks, membership organizations, etc. which include activities such as those described elsewhere, or which may be implemented by other known means: Housing, automobiles, other major purchases, etc. 10561 including purchases by one or more identities of housing, an automobile(s), other major purchases, and integrating them with appropriate personalized AKM services. A plan may include a full range of a plurality of devices 10562 such as any of those in a complete household, communications, business, entertainment, education, etc., so these may be shipped and received already configured, or they may be shipped on installed and then connected and configured after being received. Services may be opened as part of a plan 10563 such as bank accounts, insurance policies, credit cards, online services, travel services, etc. The AKM may be configured for all of the items in a plan 10564 including user identities and AKM record(s), identified devices and/or services linked to said identities and AKM record(s), etc. IndividualISM and AKM installations and configurations 10560 may also be done by shortcuts such as templates, scripts, one-step application to a group's AKM record(s), object inheritance, other types of mass settings or shortcuts, etc.; Etc. 10565.

Use devices, live one or more identities, lifestyles, etc. with AKM, AKI and AK 10566 by said members (or their family members) of the IndividualISM, including its distribution channel(s), retailers, partners, affiliates, agents, related governances and their vendors, etc. which include activities such as those described elsewhere, or which may be added by other means: A Multiple Identities (and/or Multiple Lifestyles) Plan, a Personalized Consumption Plan, or other types of Plans could include housing 10567, wireless communications 10567, transportation 10567, devices (as defined herein) 10567, etc. It could also include entertainment 10568, recreation 10568, travel 10568, etc. For a plurality of these 10566 10567 it may include AKM support in some examples AKI during use, AK, etc. to assist with growth into additional uses, higher levels of success, satisfaction, etc. Plans that include job and/or career success could include AKM support during the performance of one's job 10569, work 10569, career 10569, etc. with AKM interactive learning 10569 (such as AKI during tasks and AK to expand those task successes and related task performance) provided to expand job successes and enable work success for one or more of an individual's identities. Plans that include wealth and asset growth could also include a range of financial services 10570 including wealth growth and management assistance 10570, also with AKM interactions throughout, to help Plan customers achieve more financial success sooner. Lifestyle Expansion Plans and Social Group(s) Memberships Plans could include services and AKM assistance from multiple areas 10566 10567 10568 10569 10570 10571 to deliver any IndividualISM benefits across two or a plurality of identities and/or lifestyles. Modified copies of plans, packages or offerings from other governances, corporations, governments, etc. may include a combination of various IndividualISM benefits 10566 10567 10568 10569 10570 10571 with the addition of the IndividualISM's values such as in some examples "no contract lock-in" with the ability to exit a plan, and/or replace any part of any plan at any time. An IndividualISM's options for how its members may help "Control the Individualism" and what it sells and provides may be facilitated by two-way AKM interactions that (1) provide direct means for exercising various control options that may range from the design of an individual device to who manages the IndividualISM itself and how it is managed, and (2) provide AKM guidance while exercising each type of control, along with (3) advertising and/or other messages from those who have a stake in the outcome of said control decisions, and any other AKM use or service possible.; Etc. 10571

Reports and dashboards 10573: The AKM results from being a customer, member, subscriber, etc. of said IndividualISM 10540 10541 10550 10560 10566 may be visibly displayed in reports and/or dashboards 10573 for individuals 10574 10575, groups 10576 10577, countries 10576 10577, larger regions 10576 10577, as well as in reports and/or dashboards for varied groups such as external audiences in some examples members, prospects, members of competing governances, etc. 10578; and internal audiences in some examples an IndividualISM's managers, partners, affiliates, distributors, retailers, agents, etc. 10578, etc. 10573, and these would include reporting capabilities such as those described elsewhere, or which may be implemented by other means: So that current and recent results are visible, both short-term reports 10574 10576 and short-term dashboards 10575 10577 would show current and/or recent results by reporting and dashboard means such as described elsewhere, as well as by other reporting and/or dashboard means. So that results over longer periods of time (such as three years, five years, 10 years, etc.) are visible, both long-term reports 10574 10576 and long-term dashboards 10575 10577 would show longer-term results by reporting and dashboard means such as described elsewhere, as well as by other reporting and/or dashboard means. These reports and dashboards 10574 10575 10576 10577 10578 would be available to the IndividualISM's members 10578, prospects 10578, competitors' members who are being urged to switch to this governance's Plan(s) 10578, and others who may be reviewing, evaluating, comparing, or making other uses of said plans and the components of these and other types of plans 10578; Etc. 10579.

Results-driven adjustments and improvements 10581 10583 may be applied to each of these areas, based on the actual results achieved 10566, received and displayed 10573: Management and business operations 10582 10541: Any type of business decisions, operations, business relationships, business adjustments, reorganizations, cost cutting, new additions, promotions or discounts, plan offering changes, policy changes, sales and marketing offerings, product lines, product designs, installations or configurations, results reporting, relationships with other governances to expand offerings, etc. may be edited, updated, added, deleted, etc. in order to achieve any business goal (such as increasing the rate of visible success delivered 10566 10573) or to achieve any IndividualISM value (such as expanding the freedom, personal sovereignty, social relationships, range of identities, range of lifestyles, or control by the IndividualISM's members). Sales and marketing 10583 10550: Plans, packages and/or offerings may be adjusted (the mix of what is sold and delivered, the goal(s) or value(s) promoted by each plan or offering, etc.), how they are sold may be changed (such as by means of direct sales, partners, distributors, retailers, affiliates, social networks, values-based organizations, lifestyle organizations, etc.), as well as the promotions and/or discounts offered to achieve any sales or marketing goal (such as increasing the units sold, revenue received, etc.). Installation and configuration 10584 10560: Member-controlled or member-approved creation and/or adjustments may be made to users' AKM record(s), identities, device goals, AKM settings, etc. to achieve any installation, configuration and/or performance goal (such as increasing the rate of visible success delivered 10566 10573). Use with the AKM, AKI and AK 10585 10566: Numerous types of AKM, AKI and AK optimizations are described elsewhere and may be utilized to achieve any usage goal (such as increasing the rate of visible success delivered 10566 10573, etc.).

Unlike citizenship in a nation state government, a single person may utilize multiple simultaneous memberships in multiple governances, and thereby receive the combined benefits from a plurality of different types of governances, such as in some examples FIGS. 265 and 266: For a person's primary family relationship and lifestyle, one man or woman might join a CorporatISM FIG. 265 and receive its continuously improving benefits such as the Upward Mobility to Lifetime Luxury Plans 10450 10496. That same person might also join an IndividualISM FIG. 266 to receive its continuously improving benefits such as from a Multiple Identities (and/or Multiple Lifestyles) Plan 10540 10586, and thereby add the potential income and wealth building from multiple identities, along with potential new types of enjoyment from multiple lifestyles—perhaps with each identity exploring and enjoying a different lifestyle so that person might eventually choose to live the most in the identity and lifestyle that is preferred the most. Similarly, multiple types of competing governances may offer any legal plans or packages that this or other individuals may choose, join and enjoy simultaneously. As a result, governances may provide a plurality of educated and successful individuals, families and groups with new and more direct means for acquiring and experiencing richer, more diverse lives than are currently available.

AKM TRANSFORMED DEVICES—A DRIVER OF HUMANITY'S SUCCESS ("ANTHROTECTONICS"): FIG. 267 "AKM Transformations As a Driver of Humanity's Success" illustrates the timeline-based transformation of devices (such as products, equipment, services, applications, information, entertainment, etc.) based on three stages:

Localization 10500: Modern product design began with the emergence of the Industrial Revolution in the nineteenth century, when the division of labor separated the design from the manufacturing of a product. As ever larger-scale industrial manufacturing replaced older craft methods (where one person did both design and production) the conditions of work and life were transformed by manufacturing that was driven by steam engines, automated looms, pre-fabricated construction components (such as lumber, nails, bricks, doors, windows), and countless other goods from shoes to eating utensils to hair brushes. With the rise of mass marketing as exemplified by department stores, the Sears catalog and railroad and postal service distribution of products ordered, product design 10501 increasingly focused on the regional or national markets 10502 where products were sold, along with those customers' needs and tastes. Any support needed 10503 was provided at the same geographic scope (such as regional or national) as marketing 10502. To the extent that products were sold abroad the local products were exported 10504 to those foreign markets.

Globalization 10506: The economic transformation that began in the mid-1800s increasingly transformed products from different nation's and culture's designs to more uniform global designs. One driver was the mass manufacturing requirement for a smaller range of standard, identical components, which led to the ease of manufacturing more functional designs with reduced aesthetics. Another driver was the concept of "Utopia" or "social vision" (such as the Bauhaus school's approach, founded by Walter Gropius in Weimar) which held that new design concepts could improve people's lives and produce positive changes in society. Increasingly, products that tended to be more functional and useful, while incorporating more universal designs, could be sold globally since they also had fewer superficial embellishments or biases from a country's local culture. By the late 20th century and early 21st century, a growing range of products were being designed, created and tested in multiple countries and regions 10507, then marketed globally 10508 and supported from fewer centers located geographically to cover all time zones 10509. These products were designed from the ground up as global products for multiple markets 10506 10510, not as local products that were then exported. Mass manufactured design associated with brand marketing may have begun during the early 1900s, but it established firmer "mind share" in the popular culture during the second half of the 20th century. Today a plurality of people imagine themselves, their lives, their identities and egos within the dawn to dusk environments that they have filled with countless purchased products, furniture, utensils, clothes, house, cars, and their jobs' workspaces—within which they live, love, learn, work, enjoy life and raise families. From waking in branded sheets and comforters on the beds in which they sleep, to the branded bath products they use in the shower, the designer clothes they wear to present themselves during the day, the brand and model car they drive to work, to the packaged food they choose to eat when they cook meals and snacks, many peoples' choices of brands, products and services determines much of how they think of themselves, represent themselves to others, define themselves in social and work groups, and create their identity in society. As the last century ends and a new digital world takes hold 10511, these brands have new needs to deepen their interactive connections with their customers before, during and after use, to expand their "mind share" of their customers' self-images, and to prevent competitors from entering and capturing these increasingly direct two-way relationships.

21st Century Alignment 10512: Multiple microprocessor and digital revolutions 105111 10518 are changing a plurality of things from physical and analog 10500 10506 into digital, online and constantly connected 10511 10512 10513 10518. This appears to be producing a cultural revolution 10512 that started during the last decades of the 20th century 10511 and is expanding in the 21st century. From communications to entertainment, from centralization to decentralization, from educational institutions to lifelong learning, from traveling to online presence, from going to work to always being connected to work, from national governments to trans-border governances, from local cultural viewpoints to worldwide human capabilities 10513 10514 10515 10516, various areas of modern life are undergoing changes and may be transformed more fully as multiple new digital revolutions are still being invented. This cultural revolution may become even larger then the technological digital revolutions 10511 10518.

This technological revolution 10511 has reopened the designs of numerous devices (as defined herein, "devices" include products, equipment, services, applications, information, entertainment, etc.). Because technology is programmable, more automated products are being developed. Because a plurality of digital devices can be made modular, their features and functions are increasingly hidden inside them with numerous new types of user interfaces created to use them. Remote controls are being added as the actual devices can be pushed into the background or even online so that they disappear completely. With growing ranges of digital devices becoming modular, their various inputs and outputs are increasingly placed where design engineers want, without being tied to a single physical device or even to one location. Designers and development engineers often add whatever has become technically feasible, while vendors often add new features to boost sales (even if the new features won't or can't be used). This has prompted the emergence of a new "usability" career path and skill set, because "ease-of-use" has become a central issue for users, even if some vendors feel this is less important than having new technologies and/or functions in their products and services (a sarcastic description of adding usability is "putting lipstick on a pig"). Until digital technology matures to where it has predictable, standardized paradigms that are widely adopted, these digital transformations have opened a growing gap between normal, everyday users and the frequent changes in numerous digital devices, amid a digital environment whose designs are multiplying and spreading until a state of extreme diversity becomes all-consuming. Why is there a growing performance gap? Because our human brains and bodies have been the same for 50,000 to perhaps 100,000 years, and normal people are severely challenged by the scope and speed of these digital transformations—yet these are just beginning and are likely to continue for at least decades—a growing gap between our basic humanity and our potential achievements that suggests some potential value from new means for technology to deliver its value in better, more predictable and consistent ways.

For the moment these digital transformations are still just beginning. So far their main impact is what have been called the "c-techniques" on the supply side, which provides a chain where, for example, CAD (computer-aided design) links design to manufacturing, and supply chain systems directly link manufacturing to logistics. These "c-techniques" typically include activities that are increasingly aligned with each other in parallel processes such as: Computer-aided design (CAD) which may optionally integrate with computer-aided manufacturing (CAD/CAM); Computer-aided simulation and/or imaging; Computer-aided prototyping; Computer-aided manufacturing and/or assembly; Computer-aided logistics (inventory, distribution, packing, shipping, etc.) and supply chain management (SCM); Computer-aided marketing and sales; Computer-aided management of the business process and supply chain; Computer-aided customer support.

The biggest digital revolutions may be yet to come 10511 10512 10518, which include integrating customers and users into an interactive, holistic process that delivers new stages of achievements that include higher levels of success and satisfaction. As this shows 10513, with an Active KnowledgeMachine 10514 and new types of Governances 10515 the overall inputs and outputs result in new types of control, evaluation, measurement and usability by means of interactions during the use of devices (as devices are defined herein, either through those devices directly or by means of AIDs/AODs). As illustrated 10513, this may produce multiple types of benefits such as: Delivering higher rates of success and satisfaction to users during use 10514. New types of governances 10515 that include the AKM's feedback to vendors and designers with aggregated information on human activities at the level of goals and larger purposes, along with the use of the AKM to provide a plurality of types governance services and communications; which perform the functions of aggregation (of use, activities, the devices, designs, results, and integrated optimization and self-improvement processes) to provide various new types of management and governance at the scale possible with broad communications, resulting visibility and the new levels of human success these might enable. Numerous governances 10515 may compete with each other, including competition between different types of governances (as exemplified by IndividualISM's, CorporatISM's and WorldISM's but not limited to these), and by competition between different implementations of each type of governance—with visible AKM reporting of results achieved by each. This competition with visible AKM results produces dynamic evolving opportunities for continuously improving governances to emerge, as the most successful ones prosper and those that fail to meet needs well enough diminish due to visible results by more successful governances. At the same time, individual devices could be transformed and improved (in some examples as described in FIGS. 261 and 262), both in their own device processes and as part of governances that drive the devices it sells to deliver higher rates of success and satisfaction to the governance's customers. Together 10513 the AKM 10514 and governances 10515 are designed to provide new and simultaneous drivers of human success—at both individual and group levels—that may continuously produce higher rates of personal, group, societal, national and other types of success and satisfaction over time 10516 10518.

Because the AKM 10514 and governances 10515 are potentially global processes 10517, they transcend national borders 10517 to produce a higher level of alignment 10512 between individual activities and goals 10514 by means of an AKM(s), aggregated group goals 10515 by means of a governance(s), and the increased levels of success 10516 that are desired and may one day be provided free or purchased from one or a plurality of AKMs 10514, or provided free or purchased from one or a plurality of governances 10515. As described optimization and continuous improvement are part of AKM transformations so that higher and higher rates of success may be delivered 10513 10516 or offered for sale, so this could be the start of a transformation that continuously improves the alignment between what is produced and sold with what is wanted and used 10517 10518.

"ANTHROPOTECHTONICS—AKM TRANSFORMATIONS OF DEVICES AND GOVERNANCES: FIG. 268 "AnthroTectonics: Continuous AKM Transformations of Devices and Governances" illustrates an alternate to the current development of human reality. Instead of being driven by the past and the maintenance of the status quo, which has been a major factor limiting the creation and spread of prosperity and success for countless generations and millennia, an new equilibrium herein named "AnthroTectonics" has emerged in the Alternate Reality. Both devices (as defined herein) and governances (as defined herein) became dynamic, self-aligning instantiations of humanity's latest goals, new knowledge, emerging know-how, and new group and organizational processes that put those into use to achieve both current and new goals both individually (through the AKM) and collectively (through Governances). AnthroTectonics merges multiple drivers in a new equilibrium, some examples of which include:

First, corporations need new products and services: World leading corporations face massive new pressures to invent (or license/capture and sell) the next revolution that might sweep the marketplace, much like Apple has transformed the music industry with the iPod, the communications and personal applications industries with the iPhone, and the online store for those industries with iTunes.

Second, silent data and silent analyses: Now that a million transistors cost less than one penny vast amounts of data may be created, analyzed and discarded merely to surface the small percentage of events that are valuable to people. Some examples include the airbag sensors in automobiles which typically produce 100 to 1000 readings per second that are sent to one of the automobile's microprocessors. While this may produce more than a billion readings and analyses during the life of an automobile's airbag sensor, it is only when a crash occurs that this analyzed data becomes actionable and is used to calculate how much to deploy an airbag(s) to protect each passenger individually. Similarly, an airbag's silent data and silent analyses provide an analogy to modern devices' and networks' abilities to monitor use, surface activities (in some examples task failures), and calculate the gaps between attempts and successes—to turn attempts into implied goals, and to turn failures (or even just problems or desires) into triggers that an AKM might use to raise the rate of human success, satisfaction, etc.

Third, a new "AnthorpoTectonics power position" could become exclusive access to all or part of the world's flow of data, or at least having non-exclusive access to it: For the first time it might become possible for one corporation. a group of affiliated companies, or independent vendors to use this or parts of it (such as AKM services, AKM data and AKM analyses/reporting) to continuously transform devices and governances in multiple industries simultaneously. By means of one or more AKMs it may be possible to discover and use the hugely expanding abundance of data on activities, desires and tasks to fuel intense corporate needs to introduce frequent improvements that provide the meaningful and measurable advantages that customers really do and want: First the AKM data surfaces user needs (which are also competitive advantages or vulnerabilities) in devices and current (industry governing) market shares. Then these can be attacked by AnthroTectonics' continuous AKM transformations of devices and marketplace governance by a variety of means and processes described in a variety of ways (in some examples FIGS. 258 and 261).

Turning now to FIG. 268, AnthroTectonics equilibrium is a dynamic process in which one or a plurality of devices and governances becomes self-aligning instantiations of humanity's current goals, new knowledge, emerging know-how, and new group and organizational processes that put those into use to achieve goals individually and/or collectively. Said AnthroTectonics equilibrium includes a dynamic self-aligning process such as: The starting point is humanity's current knowledge, devices, governments, etc. 10520 10521. Goals 10522 are derived directly from sources such as AKM self-management, vendor management and/or governance-management of goal setting and goal updating in user AKM record(s) 10523, as well as by implied goals that are derived from data such as activities, tasks, etc. that are tracked and surfaced by means such as an AKM 10522, as well as by other known means that may be incorporated into an AKM. Usage 10524 is derived from current data on the uses of devices, governances, AKM services (such as AKI/AK delivery and use) 10524 10525, and by other known means that may be incorporated into an AKM, both by individuals and governances. Optimizations 10526 are comprised of reporting current results, gaps and opportunities to leap ahead such as AKI/AK results and opportunities reports, dashboards, etc. 10527 (to users—individuals or the public) on individuals, devices, groups, governances, etc.; as well as AKM results and opportunities reporting to providers 10528 such as vendors, governances, designers of new or updated devices, etc., and by other known reporting means that may be incorporated into AKM reporting and/or dashboards. New advances 10529 in the AKM, AKI/AK content 10530 (including optimizations and other types of AKM improvements), devices, governances, etc., as well as other new advances that may be integrated into an AKM, AKI and/or AK production, interactions, delivery, measurement, analysis, reporting, etc. Said new advances 10529 become the current status quo and/or baseline for continuing 10520 new rounds of continuous AnthroTectonics equilibrium 10521 10522 10524 10526 10529.

ENTERTAINMENT: While new ideas for potential technologies have been conceived by many authors, it is unusual when an author specifies those new technologies for patenting, and even more unusual when the subject of the patents are part of the entertainment product(s) created. Still more unusual is when those new technologies are in some examples related to the creation of new types of realities and are enabling devices for bringing those realities into existence—and are therefore part of the new realities. Therefore, when and if other entertainments seek to use those other realities and/or the technologies that enable them, they may be seeking to re-use proprietary property.

It is widely known and practiced that patented technologies are licensed for use in products and services, and it is also widely known and practiced that invented characters (like Winnie the Pooh, Harry Potter, etc.) are licensed for use in commercial products, entertainment products and services; therefore, in some examples it may be appropriate for technologies to be licensed for use in commercial products, entertainment products, entertainment services, marketing, etc. in the manner that a combination of character licensing and technology licensing would be practiced.

FIG. 269, "Entertainments based on the 'Reality Alternate'" illustrates some examples of using new concepts that are intellectual property in new entertainment products, and therefore licensing those properties for use in those entertainment products.

FIG. 269, "Entertainments based on the 'Reality Alternate'" also and additionally illustrates some examples of other entertainment products employing one or a plurality of RA (Reality Alternate) technologies to extend one or a plurality of entertainment products and expand their markets, sales and revenues as a result.

FIG. 270 through FIG. 282 collectively illustrate Real-World Entertainment (herein RWE) which encompasses building a multiplayer online role-playing game based on the alternate history of the Reality Alternate. In some examples this includes the next two centuries during which a cataclysmic struggle is waged for modern technological society to survive when 10 billion people lead increasingly prosperous lives and deplete the Earth's resources and carrying capacity at an ever faster rate.

FIG. 270, "RealWorld Entertainment—Summary" illustrates some examples of some divergences from online games in which RealWorld Entertainment includes in some examples a play mode, in some examples a real mode, in some examples being a play character (a created identity), in some examples being a real character (your real identity), in some examples being a play employee, in some examples being a real employee with a real income, and in some examples having plurality of play and/or real roles and being able to switch between them.

FIG. 271, "RWE Roadmap (example)" illustrates some examples of the RWE alternate history in which during a first stage currently emerging digital discontinuities cause a rapid expansion in human digital capabilities that causes an inflection point in history; a second stage during which major crises emerge and growth more frequent as 10 billion people exploit the Earth's water, energy, food growing capacity, and other resources beyond its carrying capacity; a third stage during which a great cataclysm is fought to determine whether the civilization that endures is controlled by top-down power, by economic system lock-in, or by bottom-up self-control; and a fourth stage during which an emergence begins and a self-connected, self-guided, self-control prosperous global society attempts to take shape.

FIG. 272, "RWE—Summary Timeline (example)" illustrates in its top half some examples of events that occur in each of the four stages of the roadmap, and illustrates in its autumn have some examples of RWE play roles and RWE real roles that RWE players might choose or prefer in each timeline stage.

FIG. 273, "RWE—Non-Linear Time (example choices)" illustrates some examples of how players who join the RWE may choose from any stage during the coming two centuries, and thereby be part of the events that occur in some examples during the major historic digital acceleration (stage 1 discontinuities); in some examples during the growing crises as the Earth is over exploited (stage 2 crises); in some examples during the major battles of the historic conflict when control over human civilization is determined (stage 3 the great cataclysm); and in some examples during the next emergence when billions of people have their first chance in history to consciously and individually choose their dreams and attempt to live them (stage 4 emergence).

FIG. 274, "RWE—Roles and World Views (examples)" illustrates some examples of some play roles in the RWE, some examples of real roles in the RWE, some examples of selectable world views that each player might choose, and some examples of types of governances that each player might (optionally) select.

FIG. 275, "Enter the RWE—Choose Identity, Timeline, Stage, Conflict, World view, Governance and Style," illustrates some examples of creating an identity to use when playing in the RWE, some examples of choosing that identity's moment in the timeline, and some examples of making other choices such as that identity's personal style.

FIG. 276, "Access RWE," illustrates some examples of how devices access an RWE.

FIG. 277, "Login to RWE," illustrates some examples of logging into an RWE and retrieving an existing identity, or alternatively registering and creating in some examples a new play identity, and in some examples a new real identity.

FIG. 278, "Use RWE," illustrates some examples of using the RWE in some examples as a member of an RWE group that works together and has one or more goals, in some examples as an individual RWE player with his or her own goals, in some examples dealing with events from the RWE, in some examples dealing with events from other groups or individuals in the RWE, in some examples having advertising and marketing as part of the RWE, in some examples performing transactions and ownership that includes buying and selling virtual goods and/or real goods and services (with systems for making and receiving payments of virtual money and/or real money).

FIG. 279, "Build RWE Enhancements (example)," illustrates some examples of building RWE enhancements that can also be commercial products and services using parts of RA technologies that may have commercial potentials, in some examples by groups inside the RWE, in some examples by commercial companies outside the RWE, and in some examples by first building products and services inside the RWE then converting that RWE group to a commercial company that makes real money from its products and/or services.

FIG. 280, "RWE players—Free Non-commercial Uses (example)," illustrates some examples of RWE players being granted the equivalent of a no-cost entertainment license to RA technologies combined with a no-cost technology license to RA technologies for strictly non-commercial uses, along with signing a non-commercial use license and adhering to its responsibilities.

FIG. 281, "RWE Play Conversion to 'RWE Real' Company," illustrates some examples of an RWE group creating successful products and/or services, then converting to an "RWE real" company that may sell and earn real revenues, pay salaries, own stock, and engage in other revenue generating, and income producing, commercial activities.

FIG. 282, "'RWE Real' Licensing and Royalties (example)," illustrates some examples of the reduced royalties and/or licensing fees paid by a converted "RWE real" company.

Expressions in and as entertainment: Turning now to FIG. 269, "Entertainments based on the 'Reality Alternate'," in some examples one or a plurality of specified source technologies 8201 which in this case is the "Reality Alternate" 8202 (as described elsewhere) may be utilized in creating one or a plurality of entertainment realities 8206. For one illustration, a series of novels 8222 may be written based on the divergent history of the alternate reality and the Expandaverse (as described elsewhere), along with a series of movie screenplays 8222 based on that history, along with one or a plurality of enhanced and additional digital constructs and entertainment additions 8214 8215 8216 8217 8218 8230 8231 8232 8233 8234 based on the Reality Alternate technologies (as described below in FIG. 269).

For other illustrations of how the Reality Alternate technologies may be utilized in entertainments (such as in some examples novels, in some examples movies, in some examples television shows, in some examples video games, in some examples theater, in some examples musicals, in some examples dance, in some examples art, and in some examples other forms of entertainment), consider three of many possible examples of derived entertainment realities, in some examples a first alternate reality 8207 may be created in which mass live, real-time TPDP digital entertainment "events" replace broadcast media as the main form of personal entertainment; in some examples a second alternate reality 8208 may be created in which groups develop "separate realities" by means such as the ARM and separate governances with digital boundaries between each other and Balkanize into separate and relatively disconnected digital realities with disconnected governances with separate and dissimilar lifestyles and belief systems, forming separate cultures that exist digitally on the same physical Earth; and in some examples a third alternate reality 8209 may be created in which the human race chooses to abandon outer space exploration and some types of outside activities in favor of choosing a new "inner space" based on each person enjoying multiple created digital identities, multiple digital realities that are enjoyed as various kinds of constant entertainment, interactive digital experiences, multiple personal "lives," multiple belief systems and digital means for providing digital services and earning digital incomes; and in some examples any number of other alternate realities 8210 may also be derived from the technologies specified in the "Reality Alternate" 8202. Therefore, starting from one or a plurality of parts of the "Reality Alternate" 8201 8202 it is possible to derive a plurality of entertainment realities 8206 8207 828 8209 8210 with each utilizing a plurality of Reality Alternate technologies 8201 8202 to produce and sell one or a plurality of different types of entertainment alternate reality(ies) 8207 828 8209 8210 for constructing entertainment media 8214, entertainment series 8222, and/or individual entertainment properties 8230.

In some examples one or a plurality of parts of said entertainment realities 8206 8207 828 8209 8210 may utilize the "Reality Alternate" 8201 8202 (as described elsewhere) in creating one or a plurality of entertainment media 8214. As three of many possible examples of entertainment media examples 8214 that are based on an entertainment reality 8206, in some examples a first alternate reality 8207 may be created in which mass live, real-time TPDP digital entertainment "events" replace broadcast media as the main form of personal entertainment; then in some examples of a first entertainment media novels 8215 may be set in this "mass live digital events" alternate reality, in some examples of a second entertainment media movies 8216 may be set in this "mass live digital events" alternate reality, in some examples of a third entertainment media TV shows 8217 may be set in this "mass live digital events" alternate reality, and in some examples other types of entertainment media 8216 (such as in some examples video games 8218, in some examples theater 8218, in some examples live concerts for digital event "broadcasts" 8218, in some examples museums 8218, and some examples art galleries 8218, in some examples weekend art festivals 8218, in some examples artist shows 8218 [whether physical or online], in some examples dance 8218, in some examples of opera 8218, in some examples theater 8218, in some examples Broadway shows 8218, in some examples musicals 8218, in some examples school productions 8218 [such as in some examples from high schools, in some examples from colleges, in some examples from theater schools, in some examples from music schools, in some examples from other types of schools], in some examples mime 8218, and in some examples other types of entertainment 8218) may be set in this "mass live digital events" alternate reality 8207.

In some examples one or a plurality of Reality Alternate technologies may be employed in conjunction with traditional entertainment products such as in some examples a novel 8215 about TPDP digital events may stage fictional TPDP events that are directly from the novel's story for the book's readers to attend digitally—and that expanded form of the novel is named herein a RealWorld Novel 8215 (or RWN). Because a novel's readers change over time and portions of a digital event may be recorded, one or a plurality of RWN's associated with a specific novel 8215 may be scheduled periodically (such as monthly or weekly) so that current readers may attend it (and in some examples RWN events 8215 may be separate ticketed entertainments for which readers pay additional money). In some examples for movies 8216 one or a plurality of Reality Alternate technologies may be employed in conjunction with various stages in the lifecycle of a movie such as its release in theaters, on DVDs, for instant download viewing, on television, etc. and the employed technologies are named herein a RealWorld Movie 8216 (or RWM). Because each movie is a different genre one or a plurality of Reality Alternate technologies may be customized for each genre such as a romantic movie employing digital presence technologies to involve singles in a mass dating and finding each other event 8216, while a superhero action adventure movie may provide the mass experience of a constructed digital reality where superheroes are "normal people" who walk among the digital crowd and interact personally with those present 8216. In some examples for television shows 8217 one or a plurality of Reality Alternate technologies may be employed in conjunction with various episodes in a television show's season such as successive episodes of a weekly comedy show being about Washington politicians, religious leaders, and school teachers—thereby providing a weekly Reality Alternate digital reality 8217 in which digital participants can interact with parodied characters from that week's television show 8217 and the employed technologies are named herein a RealWorld TV Show 8217 (or RWTV). In some examples other types of entertainment media 8218 may each utilize one or a plurality of Reality Alternate technologies in some examples to expand their marketing 8218, in some examples to expand their audience involvement 8218, in some examples to expand their revenues by means of ticketed events 8218, in some examples to provide additional types of entertainment 8218, and in some examples to deliver other types of entertainment 8218 or value to an entertainment property 8218.

In some examples the creator of an entertainment 8215 8216 8217 8218 and/or vendor of an entertainment 8215 8216 8217 8218 (such as in some examples a book publisher, in some examples a book seller, in some examples a movie studio, in some examples a chain of movie theaters, or in some examples any other type of entertainment vendor) may maintain a created digital reality based on a specific entertainment (such as in some examples a novel, and some examples of movie, and some examples a TV show, or in some examples any other type of entertainment) in which fans of that entertainment may be present and interact; and in some examples that constructed digital reality may be supported in some examples by purchase of the entertainment in another media, in some examples by paid admissions to the associated constructed digital reality(ies), in some examples by advertising and advertiser support, in some examples by subscriptions to the associated constructed digital reality(ies), and in some examples by other means of producing revenues or support. As some illustrations of constructed RealWorld digital realities that children may be present in, in some examples Winnie the Pooh's fans may visit the hundred acre woods and have tea with rabbit, in some examples Harry Potter fans may attend classes in Hogwarts School of Magic and Wizardry, and in some examples fans of other entertainments may enjoy other types of constructed digital realities that are associated with each type of entertainment. In addition, in some examples other Reality Alternate technologies may be employed besides constructed digital realities to provide the audiences for any specific entertainment with additional connections to each other, interactions with each other, interactions with one or a plurality of the entertainment's creators, story lines, backgrounds, images, bonus features, or other resources that utilize one or a plurality of Reality Alternate technologies. Similarly, fans of an entertainment may provide any of the additional features or capabilities that utilize Reality Alternate technologies. Therefore, starting from one or a plurality of parts of the "Reality Alternate" 8201 8202 it is possible to derive a plurality of entertainment media 8214 8215 8216 8217 8218 within each of a plurality of entertainment realities 8206 8207 8208 8209 8210, to produce and sell a plurality of different types of entertainment series 8222, and/or individual entertainment properties 8230, which in some cases may include associated RealWorld components and/or separate Reality Alternate technologies-based entertainment products or services.

In some examples one or a plurality of parts of said entertainment media 8214 8215 8216 8217 8218 may utilize the "Reality Alternate" 8201 8202 (as described elsewhere) in creating one or a plurality of entertainment series 8222. As just three of many possible examples of entertainment series 8222 that are based on an entertainment reality 8206 8207 8208 8209 8210 and one of each entertainment reality's entertainment media 8214 8215 8216 8217 8218, in some examples a first alternate reality 8207 that focuses on 24×7 live mass TPDP events that replace broadcast media as a dominant form of entertainment may contain in some examples a series of novels 8215 8222 8223, in some examples a series of movies 8214 8222, in some examples a series of TV shows 8217 8222, and in some examples a series of another type of entertainment media 8216 8222. In some examples an entertainment series 8222 that uses a first entertainment media such as novels 8215 and is set in a first alternate reality 8207 "events" may develop a main character who is an organizer and promoter of these events who can make or break entertainers' careers, as well as thrust audience "groupies" into woldwide prominence at a moments' notice, following that character's roller coaster career ride through startup, sudden frame, star-making, wild personal relationships, worldwide adventures that are simultaneously digital and physical, followed by a career crash with both resurrection and redemption, leading to more dramatic adventures than ever before. In some examples each entertainment series 8222 may include one or a plurality of individual entertainment properties that are part of a series 8222 that use one of the entertainment media 8215 in an entertainment reality 8207 that is based on the Reality Alternate 8202; such as in some examples four novels 8223 8224 8225 8226 that are based on a single character's story 8216, in some examples a first novel 8223 may tell the story of how a rock concert promoter discovers and adapts TP technologies for mass live events, tries and fails with several events only to finally triumph with the first million-person mass audience that is digitally present at a live and massive event; in some examples a second novel 8224 may tell the story of how this promoter starts building a new live (in mass digital presence) audience industry that rivals Hollywood's broadcast television show making industry, and has to fight off the older television industry's attempts to destroy it by engaging the new mass digitally present audiences to protect it and the events they now enjoy; in some examples a third novel 8225 may tell the story of how that promoter goes on to experience wild excesses that combine the suddenly arrogant personality of a stereotypical Hollywood star with the unlimited financial resources of a multi-billionaire and how those excesses cause his downfall and the financial collapse of his empire; and in some examples a fourth novel 8226 may tell the story of how that promoter realizes that his huge contributions still exceed his huge mistakes and starts using his insights to start changing the world for the better by creating mass live events that tackle social problems and grow to such enormous sizes that the public's demands start transforming those issues, producing his resurrection and redemption by the novel's end as a major new type of large and rapid public movements that are able to help create a better world faster than ever before. Therefore, the Reality Alternate 8202 may be employed in a plurality of individual entertainment properties (whether it is in some examples a series of novels 8222 8223 8224 8225 8226, in some examples a series of movies 8216 8222, in some examples a series of TV shows 8217 8222, or in some examples a series in another type of media 8216 8222) that may contain various adventures with the same main character (s).

In some examples each entertainment story in an entertainment series 8222 such as a series of novels 8223 8224 8225 8226 may employ as an RWN addition one or a plurality of Reality Alternate technologies 8215 in conjunction with each individual novel 8223 8224 8225 8226 and/or in conjunction with the series of novels 8222. Similarly, in some examples a series of movies 8216 may employ RWM 8216 in conjunction with a series of movies 8216. Similarly, in some examples a series of television shows 8217 may employ RWTV 8217 in conjunction with a series of television shows 8217. Similarly, in some examples a series from any other entertainment media 8218 may employ similar RealWorld applications 8218 of Reality Alternate technologies in conjunction with a series of those entertainments 8218. Therefore, the Reality Alternate 8201 8202 may be employed in multiple entertainment realities 8206 8207 8208 8209 8210, each with a plurality of types of entertainment media 8214 8215 8216 8217 8218, and each with a plurality of entertainment series 8222 based on the larger story(ies) of a single character or group of characters, or based in some examples on marketing, in some examples on the life cycle stages of each entertainment property, in some examples for opportunities for involving the audiences in expanded entertainments, in some examples to expand revenues by selling tickets or subscriptions to related Real World entertainment events provided with Reality Alternate technologies, and in some examples for other entertainment purposes or values.

In some examples one or a plurality of parts of said entertainment realities 8206 8207 828 8209 8210 may utilize the "Reality Alternate" 8201 8202 (as described elsewhere) in creating one or a plurality of individual entertainment properties 8230 such as in some examples by utilizing an entertainment reality 8206 8207 8208 8209 8210 that is based on the Reality Alternate 8201 8202; in some examples by utilizing an entertainment media 8214 8215 8216 8217 8218 based on an entertainment reality 8206 8207 8208 8209 8210 that is based on the Reality Alternate 8201 8202; in some examples by utilizing an entertainment series 8222 8223 8224 8225 8226 based on an entertainment media 8214 8215 8216 8217 8218 that is based on an entertainment reality 8206 8207 8208 8209 8210 that is based on the Reality Alternate 8201 8202; and in some examples by directly creating an individual entertainment property 8230 that is based on the Reality Alternate 8201 8202. In some examples an individual entertainment property 8230 includes in some examples a novel 8231 such as in some examples "Novel X", in some examples a related movie 8232 such as in some examples "Movie X", in some examples a related TV show 8233 such as in some examples "TV Show X", and in some examples other related types of individual entertainment properties 8234 such as in some examples "Property X" (such as in some examples video games 8234, in some examples theater 8234, in some examples live concerts 8234, in some examples museums 8234, in some examples an art gallery 8234, in some examples weekend art festivals 8234, in some examples an artist's show[s] 8234 [whether physical or online], in some examples dance 8234, in some examples opera 8234, in some examples theater 8234, in some examples Broadway shows 8234, in some examples musicals 8234, in some examples school productions 8234 [such as in some examples from high schools, in some examples from colleges, in some examples from theater schools, in some examples from music schools, in some examples from other types of schools], in some examples mime 8234, and in some examples other types of entertainment 8234).

In some examples each type of individual entertainment property may employ one or a plurality of RealWorld entertainment components 8230 8231 8232 8233 8234 in conjunction with in some examples RWN associated with a novel 8231, in some examples RWM associated with a movie 8232, in some examples RWTV associated with a television show 8233, and in some examples another type of RealWorld add-on that is associated with another type of individual entertainment property 8234 (as described elsewhere). Therefore, starting from one or a plurality of parts of the "Reality Alternate" 8201 8202 it is possible to derive a plurality of individual entertainment properties 8230 that may be related in some examples to entertainment series 8222, in some examples to entertainment media 8214, and/or in some examples to entertainment realities 8206, which in some cases may include associated Real World components and/or separate entertainment products or services.

As a result, in some examples the Reality Alternate 8201 8202, or in some examples one or a plurality of parts of the Reality Alternate 8201 8202, may be contractually provided for use in some examples with or in one or a plurality of types of entertainment realities 8206, in some examples with or in entertainment media 8214, in some examples with or in entertainment series 8222, and/or in some examples with or in individual entertainment propreties 8230—together comprising in some examples entertainments that utilize one or a plurality of types of Reality Alternate technologies as a component in their story or entertainment; and in some examples one or a plurality of types of RealWorld entertainment(s) that incorporate, in part of in whole, Reality Alternate technologies 8201 8202.

Redefined entertainment: In addition to the various entertainment examples of the Reality Alternate described elsewhere, there are also other examples in which "entertainment" itself may be redefined. Entertainment properties (such as novels, movies, television shows, video games, etc. are limited in effecting positive advances compared to humanity's growing dilemma of reaching major potential cataclysms when 10 billion people simultaneously try to live lives of rapidly growing prosperity while depleting and exhausting the Earth's carrying capacity and the available resources at an ever faster rate. Whether there are one or many crises, and whether the crises start falling like dominoes in a few short decades or they explode a century from now, there is little question about the possibilities for one of humanity's likely futures: the old Maltheusian forecast of limits, conflicts and collapse will return. This is the invisible mountain on our horizon (towering above the invisible elephant in the room). Limits will be reached and crises will arrive. The 10 billion people are not going away, but they will make the Earth's resources go away as they devour them. Our challenge is to collectively leap to a new level, a much higher stage of capabilities and productivity. Therefore herein, in some examples a redefinition of entertainment is much more than an entertainment vehicle, much more than a type of entertainment property, and much more than an individual property such as in some examples a novel, in some examples a movie and in some examples a video game.

As the Reality Alternate redefines entertainment in some examples, it becomes a platform for exploring new ideas in an alternate digital reality that may be valuable for humanity's survival, sustainability and prosperity as if that digital reality were real life, playing with some new options that are not real but as if they could be made real, and then bringing the best of the solutions into this reality by making real money from them. As a result that redefined type of entertainment is explicitly defined and herein it is named "RealWorld Entertainment" ("RWE").

What type of entertainment is RWE (RealWorld Entertainment)? Looking back, in the 16th century the theater was the main form of entertainment; in the 19th century it was the novel; in the first half of the 20th century movies and radio were dominant; and they were superseded by television in the second half of the last century. In our 21st century the Internet, social media and multiplayer interactive online games have been added to the types of entertainments that many millions enjoy every day worldwide. The conclusion from history is obvious: Entertainment is not a single product or just one currently enjoyed media. It is a dynamic and evolving flow between the needs of every generation and the opportunities it may use to be entertained. The one thing that has grown steadily is that other than working, sleeping and eating entertainment has become the largest thing we do with our lives—this is what we do with our discretionary time more than anything else.

The real question is why? What makes entertainment this important to us? We have free choice, so what does entertainment add that makes it such a large part of our lives? Some answers may be found by returning to ageless questions: What is the meaning of life? Who am I? What do I want to do with my life? These are basic questions that have been asked by philosophers starting with Aristotle, by the greatest thinkers and spiritual leaders, and by every person in every generation.

Today it is difficult to find genuine answers to life's most important questions. Almost no one reads philosophy outside of a university course. When science was young people turned to it, but it has grown into narrow niches, spiraling into complexities and conundrums. Governments are good at spending money they don't have and don't know how to repay, usually without fixing the real problems. Politicians pursue confrontations over leadership, economists make models without real capabilities, and climatologists make predictions without historic cyclical data that includes the Little Ice Age that just ended a few centuries ago—so that these and other "thought leaders" are viewed with cynicism and disbelief. Religions have turned away a majority who see it as ritual, and many see too many religious leaders behaving hypocritically and sometimes scandalously. News makes money by capturing attention, so it calls anything head-turning news, and biases how it describes the news with the attitude that editors guide how readers should think about what they decide is important. Public schools are disrespected by the students they serve because they know they will fail them, the next generation, and have no clue how to educate them to be the adults needed in the ever faster changing world this will become. Patriotism is strong, heartfelt and essential because the world is uncertain and dangerous, but patriotism unites us to fight each other to decide winners and losers—but doesn't solve the larger problems we all face together.

As we reach an age of possible catastrophes, where can we find answers? Entertainment is where most people have turned, not because it diverts us from the truth, but because it can tell powerful stories of people who each are on a quest to solve a problem, to overcome a difficulty, to make a relationship or a family work, to reach for the best they can be, and to triumph over terrible odds. Together, these stories reflect our need to see and understand the patterns of life, not as a lecture but as powerful emotional experiences that at their best uplift, transform, energize and inpire us. When created well and properly, entertainment takes us to the heart of reality like nothing else. It answers our need to grasp the world, to make sense of it by experiencing it through others' stories, to learn how to make our lives work, and how to become better or worse people. Actors bring a story to life by actually meaning it, by actually living each character's truths from the inside out, by making their characters' unspoken and unconscious feelings as visible as their words and gestures, by showing the real inner truths inside the characters they create.

Out of all the endless sources the media world displays to captivate us, we turn to entertainment the most because it brings us a way to feel and see what we recognize as truths through other people's lives, and through them ourselves. When all the types of answers are compared to entertainment, every one of them has limits, but entertainment is the Rosetta Stone that works the best for the most people today, because it reveals what works and what doesn't work as we each attempt to become our best and truest selves. Worldwide, its power and reach are unrivaled. The number of hours per day most people spend absorbing entertainment eclipses almost every other discretionary way they spend time.

Herein, "RealWorld Entertainment" (RWE) is a new means by which some parts of a culture may evolve through honest and powerful stories in which we, the audience, can experience them as familiar types of entertainment products, and also optionally become characters, participants, employees and other types of roles within some of these experiences. In some examples an "Expandaverse Reality Alternate" is illustrated as a new type of "RealWorld Entertainment" where the audience becomes more than its viewers. This is the step from "story telling" into a flexible alternate digital reality that may include "story telling" and "story viewing/enjoying," but also "story living," and—when and if we choose because we discover something we need—"reality replacement."

Just as every great story attempts to do, RealWorld Entertainment is designed so we can find truths, become inspired and experience a transformation. Normally, then the story ends. If a Reality Alternate enables us to create and shape one or a plurality of digital realities, then why shouldn't play become part of how we can create them, explore them, try them out and discover which are the best ones for each of us? With RealWorld Entertainment we can experience that as "identities" within one or a plurality of digital realities. If those "identities" experience their transformations for real, they can each decide if that's better than the lives they return to when not in a digital reality. If they then independently choose, this platform is designed so its "identities" can be the people who then decide to use their "play" discoveries and make what they create in play part of the real world—RealWorld Entertainment.

Turning now to FIG. 270, "RealWorld Entertainment—Summary," some examples are illustrated of some of the modes in which a user may access and "play" an RWE (RealWorld Entertainment). In some examples a user accesses an online means that in some examples enables logging in to an RWE 8240; in some examples registering to join an RWE for free 8241; in some examples registering to join an RWE for a monthly fee 8241; and in some examples making other choices related to the RWE 8242 (such as in some examples accessing more information 8242, in some examples subscribing for the free delivery of entertainment such as a serial novel 8242, in some examples subscribing for the free delivery of entertainment such as a serial novel 8242, in some examples receiving an online tour of an RWE 8242, in some examples seeing a list of next steps relative to an RWE 8242, in some examples seeing About Us information about the RWE, in some examples seeing Contact Us information for contacting different departments at the RWE 8242, in some examples viewing or searching open jobs at the RWE 8242, in some examples subscribing for the RWE's e-Newsletter, and in some examples viewing other choices relative to the RWE 8242). In some examples upon logging in 8240 user has only one identity in which case they are not offered the option of s whether or not their role in the RWE in some examples is play 8244 8248 or in some example is real 8244 8256; rather, logging in immediately places them in their appropriate role such as in some examples an identity's play role 8249 8250, in some example working in a play job 8251 8252, in some examples a real role 8257 8258, and in some examples working in a real job 8259 8260.

In some examples after logging in 8240 a user may have more than one identity in which case they are offered the option of choosing their role in the RWE 8244; In some examples a user may select in some examples a play role 8248 8249 and in some examples a play identity 8249 which in some examples may include assisting in creating or choosing simulated or virtual solutions 8250; in some examples may include assisting in developing explicit planning of simulated or virtual solutions 8250; in some examples may include assisting in delivering simulated or virtual solutions 8250; in some examples may include assisting in creating various types of simulated or virtual improvements 8250; in some examples may include becoming involved in various simulated or virtual play situations 8250; in some examples may include other types of simulated or virtual play 8250; in some examples may include assisting in creating or choosing play solutions to be tried in the real world 8250; in some examples may include assisting in developing explicit planning of play solutions to be tried in the real world 8250; in some examples may include assisting in delivering solutions 8250; in some examples may include creating various types of play improvements to be tried in the real world 8250; in some examples may include becoming involved in play strategy for becoming involved in various real situations 8250; and in some examples may include other types of play is designed to take place and/or effect the real world 8250.

In some examples a user may select in some examples a play job role 8251 and in some examples the role of a play virtual employee in a virtual company 8251 which in some examples may include assisting in designing a simulated or virtual product, service and/or solution 8252; in some examples may include assisting in building a simulated or virtual product, service and/or solution 8252; in some examples may include assisting in delivering a simulated or virtual product, service and/or solution 8252; in some examples may include assisting in marketing and/or selling a simulated or virtual product, service and/or solution 8252; in some examples may include assisting in supporting a simulated or virtual product, service and/or solution 8252; in some examples may include assisting in testing a simulated or virtual product, service and/or solution 8252; in some examples may include assisting in redesigning a simulated or virtual product, service and/or solution 8252; in some examples may include assisting in designing a product, service and/or solution 8252; in some examples may include assisting in building a product, service and/or solution 8252; in some examples may include assisting in delivering a product, service and/or solution 8252; in some examples may include assisting in marketing and/or selling a product, service and/or solution 8252; in some examples may include assisting in supporting a product, service and/or solution 8252; in some examples may include assisting in testing a product, service and/or solution 8252; in some examples may include assisting in redesigning a product, service and/or solution 8252; and in some examples may include other types of activities that an employee may perform 8252.

In some examples a user may select in some examples a real role 8256 8257 and in some examples a real identity 8257 which in some examples may include assisting in creating or choosing real solutions 8250; in some examples may include assisting in developing explicit planning of real solutions 8250; in some examples may include assisting in delivering real solutions 8250; in some examples may include assisting in creating various types of real improvements 8250; in some examples may include becoming involved in various real situations 8250; in some examples may include other types of real job activities 8250. In some examples a user may select in some examples a real unpaid job role at an RWE-related company 8256 8259 and in some examples employment as a real paid employee in a real RWE-related company 8259 which in some examples may include assisting in designing a real product, service and/or solution 8252; in some examples may include assisting in building a real product, service and/or solution 8252; in some examples may include assisting in delivering a real product, service and/or solution 8252; in some examples may include assisting in marketing and/or selling a real product, service and/or solution 8252; in some examples may include assisting in supporting a real product, service and/or solution 8252; in some examples may include assisting in testing a real product, service and/or solution 8252; in some examples may include assisting in redesigning a real product, service and/or solution 8252; and in some examples may include other types of activities that a real employee may perform 8252.

In some examples a user may switch identities 8264 and/or switch roles 8264 after using in some examples a play identity 8249 8250, in some example after using a play job role 8251 8252, in some examples after using the role of a play virtual employee in a virtual company 8251 8252, in some example after using a real identity 8257 8258, in some example after using a real unpaid job role 8259 8260, and in some examples after using a real paid employee at a real RWE-related company 8259 8260. When a user performs said switch 8264 said user is prompted for their identity selection 8244 and/or role selection 8244 among their individually available choices of play identities 8248 8249, play jobs 8251, play employment 8251, real identities 8256 8257, real unpaid jobs 8259, and/or paid employment 8259. In some examples a user may also choose other choices 8264 8242 (as described elsewhere), or in some examples also exit the RWE 8264 8265.

RWE roadmap and timeline: Turning now to FIG. 271, "RWE Roadmap (example)," some examples are illustrated of an example RWE based upon the Reality Alternate technologies and the accompanying alternate history introduced in FIG. 1 and elsewhere. As described elsewhere FIG. 1 illustrates previous stages of history that remain the same such as early agriculture 14, city states 15, empires 16, dark ages 17, Renaissance 18, and the Industrial Revolution 19. FIG. 1 also illustrates the Reality Alternate's digital discontinuities 20 followed by the emergence of the Expandaverse 12 and the Expandaverse's digital realities 21, its new technologies 21, its new devices 21, some new sources of wealth 24, and a new source of control over the Expandaverse's culture 27. In some examples this alternate history continues with successive stages 8270 that occur over time 8271. In some examples the RWE provides a visible roadmap and timeline that spans about two centuries, and a story line that "players" may employ in a non-linear way (that is, they may play at any moment, discontinuity, transformation, reversal, crisis, cataclysm, or future resolution in this alternate reality) to enjoy the "entertainment" of dealing with and/or simulating life in any of that reality's coming stages, events or alternate lifestyles by means of online game play.

In some examples of an RWE it's alternate reality roadmap includes humanity's possible coming crises due to the simultaneous achievements of a population of 10 billion people with billions more entering the middle-class in large and mid-sized cities in numerous developing countries, producing overwhelming stresses on the Earth's carrying capacities for food, water, climate, consumption, etc. In this RWE alternate reality these stresses mount to critical levels over the next two to five decades. About a half-century from now, in this RWE alternate reality it becomes widely recognized that after another century (about 150 years from now) these stresses are likely to force a Maltheusian collapse that will doom billions of people and cause the collapse of numerous natural ecosystems worldwide—collapsing what's left of the natural world along with ourselves. In the RWE's alternate history it also becomes widely recognized that entirely new answers must be invented to avoid more crises and an eventual catastrophe.

Even though this RWE's roadmap and timeline may be "played" in non-linear ways, they still have a linear history. In some examples each linear RWE stage provides new and different ways for individuals to make a powerful impact on dealing with the RWE alternate reality's possible collapse of human prosperity and our planet.

In a first stage a simultaneous advent of digital discontinuities 8274, Reality Alternate technologies and other transformations (such as described in FIG. 2 and elsewhere). provide new communications and digital presence technologies ways for people to deal with the growing proximity of crises and potential collapses. In a second stage a historic digital inflection 8275 accelerates with the growth of simultaneous transformations and reversals as described elsewhere. In a third stage humanity's excessive growth cause the start of sudden and unexpected crises. By this time there are new devices, digital realities, infrastructure, tools and many other advances that enable everyday people to work together worldwide and tackle the crises—becoming increasingly proactive about solving them. In a fourth stage a major historic conflict begins between those with power who want to force people who are constantly threatened by crises to remain under control, while a growing number (billions) of educated and prosperous people want to break away from these controls and actively solve the problems. In a fifth stage a major emergence begins in which connected, self-guided people increasingly take coordinated self control over their lives, their societies and the future. In a brief summary, this example RWE provides ways for people to participate in an experience of how modern technological civilization might or might not survive a historic convergence between humanity's successes, the Earth's carrying capacity, and a transforming conflict between self-control, economic system lock-in, and top-down domination.

Turning now to FIG. 272, "RWE—Summary Timeline (example)," some examples are illustrated of the alternate reality's "history" 8284 (such as illustrated in the top half of the figure), as well as example illustrations of the RWE's "play" activities 8285 and the RWE's "real" activities 8285. In some examples each of the roadmap stages is summarized in a linear timeline that proceeds from near-term dates on the left to about two centuries from now on the right 8286.

In some examples the first stage's 8290 alternate history 8284 includes discontinuities and a digital inflection in human history that are summarized in FIG. 2 and elsewhere; in some examples these include technological discontinuities 8291 (such as described in the Reality Alternate), in some examples these include organizational discontinuities 8292, in some examples these include economic discontinuities 8292, in some examples these include cultural discontinuities 8293, and in some examples these include other types of transformations. In some examples of the RWE 8285 this first stage 8290 is characterized by RWE "play" 8294 8295 such as in some examples playing at solving issues 8294; in some examples playing at planning how to implement solutions 8294; in some examples delivering those play-produced attempts at solving issues 8294; in some examples providing some play-produced improvements 8294; in some examples playing at new designs for Reality Alternate technologies that can transform this alternate history 8295; in some examples building simulated, virtual or initial versions of Reality Alternate technologies that can transform this alternate history 8295; in some examples delivering simulated, virtual or initial versions of Reality Alternate technologies that can transform this alternate history 8295; in some examples supporting simulated, virtual or initial versions of Reality Alternate technologies that can transform this alternate history 8295; in some examples redesigning and improving simulated, virtual or initial versions of Reality Alternate technologies that can transform this alternate history 8295; and in some examples building some components of Reality Alternate infrastructure that can transform this alternate history 8295.

In some examples the second stage's 8300 alternate history 8284 includes a series of growing crises that are related to the pressures of 10 billion people attempting to live prosperous lives simultaneously with diminishing energy resources 8301 8302 8303 8304, shrinking per person availability of fresh water 8301 8302 8303 8304, increasing scarcities of basic grain crops from meat-rich diets 8301 8302 8303 8304, food production difficulties from exhausting the soil with constant overproduction 8301 8302 8303 8304, resource depletion from mass consumption by billions of people reaching middle-class prosperity 8301 8302 8303 8304, unstoppable human pressures on many natural ecosystems 8301 8302 8303 8304, intensifying climate change 8301 8302 8303 8304, and other stresses 8301 8302 8303 8304. In some examples of the RWE 8285 this second stage 8300 is characterized by both RWE "play" 8285 8305 8306 an RWE "real" activities 8285 8305 8306. In some examples "play" includes playing at solving issues 8305; in some examples playing at planning how to implement solutions 8305; in some examples delivering those play-produced attempts at solving issues 8305; in some examples providing some play-produced improvements 8305; in some examples playing at new designs for Reality Alternate technologies that can transform this alternate history 8306; in some examples building simulated, virtual or initial versions of Reality Alternate technologies that can transform this alternate history 8306; in some examples delivering simulated, virtual or initial versions of Reality Alternate technologies that can transform this alternate history 8306; in some examples supporting simulated, virtual or initial versions of Reality Alternate technologies that can transform this alternate history 8306; in some examples redesigning and improving simulated, virtual or initial versions of Reality Alternate technologies that can transform this alternate history 8306; and in some examples building some components of Reality Alternate infrastructure that can transform this alternate history 8306. In some examples "real" activities include an unpaid job 8306 and in some examples include paid employment 8306. In some examples said "real" activities may include assisting in designing a real product, service and/or solution 8306; in some examples may include assisting in building a real product, service and/or solution 8306; in some examples may include assisting in delivering a real product, service and/or solution 8306; in some examples may include assisting in marketing and/or selling a real product, service and/or solution 8306; in some examples may include assisting in supporting a real product, service and/or solution 8306; in some examples may include assisting in testing a real product, service and/or solution 8306; in some examples may include assisting in redesigning a real product, service and/or solution 8306; and in some examples may include other types of activities that a real employee may perform 8306.

In some examples the third stage's 8310 alternate history 8284 includes a growing cataclysmic conflict between in some examples and emerging future 8311 versus past and historical systems of human control 8311 and cultural control 8311; between in some examples top-down control 8312 versus system lock-in control 8312 versus emerging self-guided processes based on educated and highly capable mass self-control 8312; and in some examples a growing great cataclysm between forces that want to keep power over people 8313 and the start of billions of people having a great deal of power and wanting control of themselves 8313. In some examples of the RWE 8285 this third stage 8310 is characterized by RWE "real" activities 8285 8314 8315. In some examples "real" activities include solving issues 8314; in some examples planning how to implement solutions 8314; in some examples delivering those issues solutions 8314; in some examples implementing and pushing through numerous types of improvements 8314. In some examples "real" activities include new designs that target rapid positive transformations in this alternate history 8315; in some examples building technologies, products and/or services designed to rapidly help transform this alternate history 8315; in some examples delivering technologies, products and/or services designed to rapidly help transform this alternate history 8315; in some examples supporting technologies, products and/or services designed to rapidly help transform this alternate history 8315; in some examples redesigning and improving technologies, products and/or services designed to rapidly help transform this alternate history 8315; and in some examples building some components of Reality Alternate infrastructure that can help transform this alternate history 8315. In some examples "real" activities include an unpaid job 8315 and in some examples include paid employment 8315. In some examples said "real" activities may include assisting in designing a real product, service and/or solution 8315; in some examples may include assisting in building a real product, service and/or solution 8315; in some examples may include assisting in delivering a real product, service and/or solution 8315; in some examples may include assisting in marketing and/or selling a real product, service and/or solution 8315; in some examples may include assisting in supporting a real product, service and/or solution 8315; in some examples may include assisting in testing a real product, service and/or solution 8315; in some examples may include assisting in redesigning a real product, service and/or solution 8315; and in some examples may include other types of activities that a real employee may perform 8315.

In some examples the fourth stage's 8320 alternate history 8284 includes a new emergence in some examples of roads 8321 that are visible only to some, in some examples selective constructed digital realities 8322 (a.k.a., private invisible worlds 8322) that only some are permitted to enter, in some examples a rebirth of happiness 8323 and joy 8323 based on highly variable and personalized achievements that are what each person desires in life with systems that help them reach that; and in some examples a final battle 8324 between those who want everyone to be what they think people should be 8324 and those who believe that a person is what ever he thinks he is 8324. In some examples of the RWE 8285 this fourth stage 8320 is characterized by both RWE "play" 8285 8325 8326 an RWE "real" activities 8285 8325 8326. In some examples "play" includes playing at solving issues 8325; in some examples playing at planning how to implement solutions 8325; in some examples delivering those play-produced attempts at solving issues 8325; in some examples providing some play-produced improvements 8325; in some examples playing at new designs for Reality Alternate technologies that expand personal abilities and immediately available choices in this alternate history 8326; in some examples building Reality Alternate technologies that expand personal abilities and immediately available choices in this alternate history 8326; in some examples delivering Reality Alternate technologies that can expand personal abilities and immediately available choices in this alternate history 8326; in some examples supporting Reality Alternate products and services that can expand personal abilities and immediately available choices in this alternate history eight 326; in some examples redesigning and improving Reality Alternate products and services that expand personal abilities and immediately available choices in this alternate history 8326; and in some examples building some components of Reality Alternate infrastructure that can expand personal abilities and immediately available choices in this alternate history 8306. In some examples "real" activities include an unpaid job 8306 and in some examples include paid employment 8306. In some examples said "real" activities may include assisting in designing a real product, service and/or solution 8326; in some examples may include assisting in building a real product, service and/or solution 8326; in some examples may include assisting in delivering a real product, service and/or solution 8326; in some examples may include assisting in marketing and/or selling a real product, service and/or solution 8326; in some examples may include assisting in supporting a real product, service and/or solution 8326; in some examples may include assisting in testing a real product, service and/or solution 8326; in some examples may include assisting in redesigning a real product, service and/or solution 8326; and in some examples may include other types of activities that a real employee may perform 8326.

Non-linear time: Turning now to FIG. 273, "RWE—Non-Linear Time (example choices)," some examples are illustrated of how one player may choose one or a plurality of in some examples roles, in some examples identities, in some examples goals, in some examples challenges, in some examples confrontations, in some examples battles, in some examples play situations, in some examples real situations, in some examples real companies, etc. that are based in any time and event across an entire RWE alternate reality. In some examples a user may choose to participate in a play crisis 8341 during timeline stage 2 "crises" 8340, while in some examples also choosing to participate in a real transition 8336 being attempted by a real company during timeline stage 1 "discontinuities" 8330, while in some examples also choosing to participate in a distribution project 8364 that is attempting to foster digitally cloned prosperity during timeline stage 4 "emergence" 8360. In some examples one player may choose to participate in one alternate reality moment and opportunity that interests them; in some examples one player may choose to participate in a plurality of alternate reality moments and opportunities from different stages of the alternate history's timeline and evolution; in some examples one player may choose to follow a plurality of currently active alternate reality moments and opportunities by being interested in them and wanting to know what they produce but not wanting to actually participate in them; and in some examples one player may choose to participate in one or a plurality of alternate reality moments from different stages of the alternate history's timeline 8330 8340 8350 8360, and simultaneously follow one or a plurality of active alternate reality moments to know what they are producing and how that might be used.

In some examples a player might consider their options for RWE participation based on their interests rather than on an RWE's logical timeline, so in some examples a player who is interested in fighting might start with timeline stage 3, "the great cataclysm" 8350. In this RWE the great cataclysm has three sides that are contending for ultimate power, and these include those who want dictatorial political power and fight for top-down control, a second group who want complete economic control and fight for lifetime economic system lock-in, and those who want prosperous freedom for all and fight for independent self-control in a prosperous and free world. Because of multiple identities in some examples a player may choose to have an identity and a role on one, two or three of those sides. Because more players may participate than fit on a single server or a cluster of servers in some examples the same great cataclysm may be fought out on a plurality of different servers in different locations, each with different strategies and different outcomes to the great cataclysm stage. In some examples the different groups who are all on the same side may coordinate within one server but not with those fighting on the same side in the same great cataclysm stage on a different server; but in some examples different groups who are all on the same side may coordinate across multiple servers to transfer knowledge and capabilities so that the best and most successful strategies may be applied rapidly and provide greater challenges for those who oppose them.

In some examples each of the sides have parallel types of groups who build and implement their own systems, tools, solutions, etc. to meet their side's needs, and to win battles and the larger struggle for control. However, in some examples one type of group may create and employ very different systems, strategies and operations based on their goals such as recruitment and mobilization; in some examples there are dramatic differences between the economic incentives of those who seek and operate by economic lock-in, versus the command and control systems of those who seek and operate by top-down control, versus those pursuing freedom who rely on independent and voluntary participation to win. In some examples these differences translate into highly different types of systems and operations, so it is possible to see more connections between different types of organization and the different results each is capable of producing.

In some examples, while it is possible to describe a group such as recruitment, the "side" doing the recruiting may use very different processes and incentives that another side so that in some examples one group may build and operate recruiting systems 8351 to find and recruit new players to serve as their soldiers in some examples, workers in some examples, employees in some examples, undercover operatives (spies) in some examples, or other roles in some examples. In some examples other groups may build, operate, direct, conduct and/or perform operations that make various types of contributions to their side's efforts such as in some examples mobilization systems 8352, in some examples intelligence systems 8356, in some examples logistics systems 8357, in some examples rapid R&D 8358 to create new ideas or systems needed to win battles or fights, and in some examples other types of groups that make contributions. In some examples other groups may conduct military operations and battles such as in some examples real-time battles 8353, in some examples commanding a "digital army" 8353, in some examples rapid deployments 8354, in some examples directory or performing rapid fighting responses 8355, and in some examples other types of groups that conduct military operations and battles. In some examples some groups may develop play-based solutions that are designed solely to fit the RWE, while in some examples some groups may develop "real" solutions that are designed to be tried in the RWE and then marketed and sold outside of it by a "RWE real" company (as described elsewhere).

In some examples a player who is interested in solving social problems and crises might start with timeline stage 2, "crises" 8340. In this RWE the crises include those that are foreseeable and predicted over the next century as population grows, prosperity spreads to billions in the middle-class, and the Earth's resources and natural ecosystems and carrying capacities are depleted. In some examples unexpected crises may include man-made life and death crises such as in some examples mass murderers 8345 (such as in some examples about 20 genocides and mass killings are said to have occurred in the second half of the 20th century); in some examples natural life and death disasters 8345 (such as geological disasters, hydrological [water] disasters, weather disasters, fires, epidemics, famines, etc.) and the results from major disasters such as the collapse of the Japanese nuclear reactors 8345 after its earthquake and tsunami; in some examples wars 8345; and in some examples other types of unexpected crises that might benefit from entirely new strategies and approaches 8345. In some examples continuing terrible conditions cause large groups to be extremely vulnerable to any downturn in some groups may attempt to design and build solutions 8345 such as in some examples widespread poverty 8345; in some examples multi-generation economic stagnation 8345; in some examples officially mandated coverups and untruths such as by dictators which are easy to disprove from outside the dictatorship but not easy to spread the truth inside of it 8345; in some examples hatreds between neighboring ethnic groups 8345; in some examples oppression by a dictatorial group or minority 8345; and in some examples other continuing and difficult conditions that might benefit from entirely new approaches 8345.

Therefore in timeline stage 2, "crises" 8340 both RWE play and RWE real strategies might be attempted against crises, events and conditions within the RWE; and in some examples those that are most successful might be tried in the real world. In some examples one group may build and operate a new way to deal with a specific type of crisis 8341 8342 (within the RWE) such as spiking food prices caused by shortages of basic grains (whether from any of numerous causes such as in some examples drought, in some examples too much rainfall, in some examples flooding, in some examples climate change, in some examples trade wars, or in some examples other causes). In some examples another group may build and operate a new way to deal with multiple types of serious events such as natural disasters 8343 8344 such as a new way to find the supplies needed, then move them even faster to where they are needed—with fast real-time response systems that fit a range of needs—such as in some examples immediately creating and connecting entire disaster relief chains from givers through suppliers through transporters through distribution with real-time and involvement of bureaucrats who can clear roadblocks to provide the fastest possible relief to the people in need. In some examples some groups may develop play-based solutions 8341 8343 that fit the RWE, while in some examples some groups may develop "real" solutions 8342 8344 that are designed to be tried in the RWE and then marketed and sold outside of it by a "RWE real" company (as described elsewhere).

In some examples a player who is interested in the new ways the alternate history is transforming itself digitally might start with timeline stage 1, "discontinuities" 8330. This RWE stage includes multiple reversals and transformations as described elsewhere (such as in FIG. 2). In some examples a player may join play-based groups 8330 such as in some examples a group that is building and operating a new way to deal with a problem 8331 in the RWE; in some examples a group that is situation focused 8333 and creating a way to change a situation in the RWE; in some examples a group that is attempting to drive a transition 8335 where they produce positive change(s) in the RWE; in some examples a group that focuses on individuals becoming the identity and person they really want to be 8337; and in some examples some other types of play-based groups that focus on benefits from technological changes, or on producing faster and more focused technological benefits. In some examples a player may join a "RWE real" company 8330 or RWE real group 8330 that may use in the real world what it develops in the RWE, such as in some examples a group that is building and operating a new way to deal with a problem 8332; in some examples a group that is situation focused 8334 and creating a way to change a real situation; in some examples a group that is attempting to drive a transition 8336 where they produce positive change (s); in some examples a group that focuses on its members as the real individuals they are becoming the identity and person they really want to be 8338; in some examples some other types of RWE real groups that focus on benefits from technological changes 8330, or on producing faster and more focused technological benefits 8330; and in some examples first trying their solutions in the RWE and then marketing and selling them outside of it as a "RWE real" company (as described elsewhere), or by other means that make RWE solutions real. For one illustration a Freedom from Dictatorships System may be developed in some examples as a "play" system 8331 8333 8335 to provide those who live under top-down control in the RWE with ways to obtain secret digital freedom; and in some examples a Freedom from Dictatorships System may be developed by a "RWE real" company as a real system 8332 8334 8336 to provide secret digital freedom to real people who live under real dictators in oppressive countries around the world.

In some examples a player who is interested in the a possible new emergence of widespread prosperity, freedom, sustainability, environmental rebalancing, or people becoming the best they can be in the ways they choose might start with timeline stage 4, "emergence" 8360. This RWE stage 8360 focuses on making multiple large advances and fundamental transformations torward becoming the societies and peoples we dream we can be. In some examples a player may join groups that are here expressed as high-level goals but would each be instantiated based upon practical realities and then current potentials in the RWE at its stage of its alternate history, with the higher goal that those who contribute to this stage's groups develop solutions that work well enough to bring them into their own personal real lives. That is, timeline stage four, "emergence" 8360, aims for the "finish line" so that instead of working to get their by going A, B, C, D . . . all the way to Z, these groups attempt to specify "Z" and find a way to go there in one step. Yes, this is ambitious but when it works the results are worth it.

In some examples one group may take the ultimate challenge of trying to define ideals and perfection 8361 and then making it real 8361; in some examples another group may look at the speed with which middle-class prosperity is starting to include billions more people and attempt new systems that include billions more by advancing them digitally 8362, such as in a developing country that does not have landline telephones so it immediately leaps to a nationwide cellular network and skips the landline telephone stage; in some examples another group may look at which parts of prosperity might be digitally cloned and distributed worldwide immediately 8363 and develop appropriate systems for doing that rapidly; in some examples another group may consider the sustainability of economic growth that spreads prosperity to billions more over the next century or two 8364 and considers how to define and distribute prosperity in more sustainable ways 8364; in some examples another group may look at alternate business models 8365 to consider how more people might earn better incomes while also producing more output and more value; in some examples another group might look at the practices of nation state governments 8366 relative to the growing self-control of people who are able to enjoy multiple identities and rapidly expanded lives; in some examples another group might look at possible future stages 8367 to determine if the RWE's four stages (discontinuities 8330, crises 8340, cataclysm 8350 and emergence 8360) are sufficient or if the RWE should add more stages 8367; and in some examples another group may consider non-linear causality 8368 because in the RWE examples may show that cross-fertilization may come from anywhere and from any time, to affect any other RWE place and time 8368.

In some examples RWE cross-fertilization 8370 may illustrate why understanding causality 8368 (from any project and any time to any other project and any other time) is valuable. In one illustration of cross-fertilization 8370 a stage four 8360 "RWE real" company may sell a real system it developed to deliver for digitally cloned prosperity 8363 to a stage two 8340 play group 8341 that is creating worldwide instant supply chain formation systems for real-time organization and delivery of help as soon as a natural disaster occurs 8341, and the people in the stage two play group live stage one 8330 lives where some of them are also in stage one play groups 8331 8333 8335 8337 to help them understand, cope with and drive their discontinuities 8330 to produce positive results.

In another illustration of cross-fertilization 8370 stage three 8350 intelligence group 8356 may be focused on identifying obstacles to rapid victories, as well as identifying those obstacles' vulnerabilities and weaknesses; to obtain support they 8356 may sell or provide services to teams in other stages 8330 8340 8360 such as selling their expertise and systems to a stage two 8340 team developing "RWE real" digital processes 8342 to find refugees digitally during political crises in dictatorial countries, then track them digitally and help them transition to stability—with the goal of building strong positive personal relationships with formerly oppressed peoples at the first moments they become free and need this help the most.

RWE roles and world views: Turning now to FIG. 274, "RWE—Roles and Worldviews (examples)," some examples are illustrated of some selections 8380 8400 8410 players might make in the type of RWE illustrated herein. In some examples said selections may include in some examples player selectable play roles 8381 8382 8383 8384 8385 8386 8387, in some examples player selectable "RWE real" roles 8391 8392 8393 8394 8395 8396 8397, in some examples player selectable world views 8400 8401 8402 8403 8404 8405 8406 8407 8408, and in some examples player selectable types of governances 8410 8411 8412 8413 8414.

In some examples player selectable play roles 8380 8387 include roles, goals and situations in the RWE alternate history where the player uses digital tools to participate digitally. In some examples selecting a play role may include selecting a virtual character 8381 which in some examples may use the image of the real player 8381 and in some examples may use an alternative selected or constructed image 8381; in some examples a play role may include joining a play company 8382 which in some examples may include a virtual job 8382 and in some examples may include virtual income 8382 (such as a virtual salary or a virtual paycheck); in some examples a play role may be a builder's role 8383 which in some examples includes helping create what a group builds 8383, in some examples includes helping make what a group sells 8383, in some examples includes helping sell a group's virtual products and/or virtual services 8383, and in some examples includes other tasks that a virtual employee might perform 8383; in some examples a play role may be a consumer's role 8384 which in some examples includes buying what's new from other groups 8384, in some examples includes using what's new 8384, in some examples includes expanding the use of what's new into new applications 8384, and in some examples includes providing feedback to the builders as to what does work and what doesn't work when something new is used; in some examples a play role may include choosing play settings that are real 8385 which in some examples may include real locations 8385, in some examples may include a real form of government 8385, in some examples may include a real situation 8385, and in some examples may include making other real settings choices 8385; and in some examples a play role may include choosing play settings that are virtual and constructed digitally 8386 which in some examples may include virtual locations 8386, in some examples may include governances 8386, in some examples may include situations 8386, and in some examples may include making other virtual settings choices 8386.

In some examples player selectable "RWE real" roles 8380 8397 include roles, goals and situations in "RWE real" groups 8397 or in "RWE real" companies 8397 where a player uses digital tools to participate digitally, but the group or company addresses real world needs by attempting to create, sell and make real money from new types of real solutions. In some examples selecting a "RWE real" role may include using one's real identity 8391 and in some examples using a selected multiple identity constructed for this role 8391; in some examples a "RWE real" role may include joining a "RWE real" company 8392 which in some examples may include a virtual job without pay 8392 and in some examples may include a real job with real income 8392 (such as a salary or a paycheck); in some examples a "RWE real" role may be a builder's role 8393 which in some examples includes helping create what a "RWE real" company builds 8393, in some examples includes helping make what a "RWE real" company sells 8393, in some examples includes helping sell a "RWE real" company's products and/or services 8393, and in some examples includes other tasks that an employee might perform in a job 8393; in some examples a "RWE real" role may be a consumer's role 8394 which in some examples may include buying what's new from other groups 8394, in some examples may include using what's new 8394, in some examples may include trying to use what's new in new applications 8394, and in some examples may include providing feedback to the builders as to what does work and what doesn't work when something new is used; in some examples a "RWE real" role may include choosing real settings 8395 which in some examples may include real locations 8395, in some examples may include a real form of government 8395, in some examples may include a real problem situation 8395, and in some examples may include making other real settings choices 8395; and in some examples a "RWE real" role may include choosing settings that are virtual and constructed digitally 8396 which in some examples may include virtual locations 8396, in some examples may include governances 8386, in some examples may include a problem situation 8396, and in some examples may include making other virtual settings choices 8396.

In some examples player selectable RWE world views 8400 include in some examples selecting one or a plurality of world views 8401 8402 8403 8404 8405 8406 8407 8408, and in some examples specifying the intensity of that view so the RWE knows how much priority and/or emphasis to give it when you experience various RWE events, crises, etc. In some examples a player may select one or a plurality of RWE world views 8400 such as in some examples by using check-boxes for the specific world views desired 8400, and in some examples by using another selection means 8400. In some examples the available RWE world views may be presented in pairs 8400 so that a user may select one or a plurality of pairs 8401 8402 8403 8404 8405 8406 8407 8408 and then adjust an indicator to show the degree of strength between each matched pair. In some examples a player may select the RWE world view pair "humanity will triumph versus the end is coming" 8401 and then adjust an indicator to show the priority the RWE should use in how you are treated between these matched alternatives 8401; in some examples a player may select the RWE world view pair "choose who you are versus be what you should be" 8402 and then adjust an indicator to show the priority the RWE should use in how you are treated between these matched alternatives 8402; in some examples a player may select the RWE world view pair "accept the way the world is versus wanting rapid positive changes" 8403 and then adjust an indicator to show the priority the RWE should use in how you are treated between these matched alternatives 8403; in some examples a player may select the RWE world view pair "change is good versus change is futile and destructive" 8404 and then adjust an indicator to show the priority the RWE should use in how you are treated between these matched alternatives 8404; in some examples a player may select the RWE world view pair "happiness is achievable versus happiness can't be achieved" 8405 and then adjust an indicator to show the priority the RWE should use in how you are treated between these matched alternatives 8405; in some examples a player may select the RWE world view pair "new knowledge creates good versus new knowledge is evil" 8406 and then adjust an indicator to show the priority the RWE should use in how you are treated between these matched alternatives 8406; in some examples a player may select the RWE world view pair "societies should have an open culture and open classes versus being static and rigid" 8407 and then adjust an indicator to show the priority the RWE should use in how you are treated between these matched alternatives 8407; and in some examples a player may select the RWE world view pair "upward mobility for all versus people should stay in their place" 8408 and then adjust an indicator to show the priority the RWE should use in how you are treated between these matched alternatives 8408.

In some examples a player selects an RWE governance 8410, which in the RWE's alternate history do not replace governments but provide means for alternate governance that adds benefits to each governance's members that governments do not provide. In some examples of an RWE, player selectable governances 8410 include in some examples an IndividualISM 8411 (a form of self governance that is described elsewhere); in some examples a CorporatISM 8412 (a form of economic governance by a group of corporations that is described elsewhere); in some examples a WorldISM 8413 (a form of trans-boarder governance based upon a broad philosophy or belief such as environmentalism, ethnic identity, a belief system, spirituality, religion, etc. that is described elsewhere); and in some examples another type of governance 8414 that may be developed by a group of RWE players. In the RWE a player may join one or a plurality of governances 8411 8412 8413 8414; and in some examples since governances add benefits without changing a player's real government, a player may join or leave one or a plurality of governances anytime they choose.

Enter an RWE: Turning now to FIG. 275, "Enter an RWE—Choose Identity, Timeline, Stage, Conflict, World View, Governance and Style," some examples are illustrated of some steps taken by a new player in some examples when entering the RWE for the first time, and in some examples when adding an additional identity. In some examples when entering an RWE a player creates an identity 8420, and in some examples a player chooses an identity 8420, and in some examples a player chooses an identity template and then customizes it 8420. In some examples an identity includes a name 8421 which in some examples may be an RWE-only name 8421 and in some examples may be a player's real name 8421; in some examples an identity includes a gender 8421 which in some examples may be a player's real gender 8421 and in some examples may be a different gender selected for the RWE 8421, and in some examples may be a non-traditional gender such as trans-gender, bi-sexual, etc. 8421; in some examples an identity includes the player's age 8421 which in some examples may be a player's real age 8421 and in some examples may be a different age selected for the RWE 8421; in some examples an identity includes the player's residence location 8421 which in some examples may be where a player lives 8421 and in some examples may be a different residence location selected for the RWE 8421; in some examples an identity includes the player's background or back story 8422 which in some examples may be a player's real bio, resume, etc. 8422 and in some examples may be a different background constructed or selected for the RWE 8422; in some examples an identity includes the player's current situation 8423 which in some examples may be a player's real current situation 8423 and in some examples may be a different current situation selected for the RWE 8421; in some examples an identity includes the player's skills and/or talents 8423 which in some examples may be a player's real skills and/or talents 8423 and in some examples may be different skills and/or talents selected for the RWE 8423; in some examples an identity includes the player's short-term goals 8424 which in some examples may be a player's real short-term goals 8424 and in some examples may be different short-term goals selected for the RWE 8424; in some examples an identity includes the player's long-term (lifetime) goals 8424 which in some examples may be a player's real long-term (lifetime) goals 8424 and in some examples may be different long-term (lifetime) goals selected for the RWE 8424; and in some examples an identity includes other selections and/or choices by the player 8425 which in some examples may reflect a player's real life and real choices 8425 and in some examples may be different from the player's real life and selected for the RWE 8425.

In some examples a player chooses their identity's 8420 moment from the RWE timeline 8431 including in some examples the stage 8431 (discontinuities, crises, cataclysm or emergence), in some examples the group 8431, and if appropriate in some examples the conflict and side 8431 (such as in some examples during the great cataclysm where three sides fight for ultimate power and control). In some examples a player also chooses in some examples their role 8432, in some examples their world view 8432, and in some examples their governances 8432. In some examples a player also chooses a dominant personal style 8440 which the RWE uses to help define and shape in some examples the identity's situation, in some examples the information presented to the player by the RWE, in some examples the situations encountered by the player, in some examples the types of non-playing characters in the player's environment, and in some examples other settings utilized by the RWE to shape a player's experience. In some examples a player may select the dominant personal style of love 8441 such as in some examples searching for romance with other players who may also be interested in love 8441, in some examples searching for one's soulmate 8441, in some examples seeking salvation through a personal relationship 8441, etc.; in some examples a player may select the dominant personal style of an epic 8442 such as in some examples a player fighting an oppressive situation 8442, in some examples a player fighting an overbearing government 8442, etc.; in some examples a player may select the dominant personal style of horror 8443 such as in some examples terrible surprises 8443, in some examples encountering horrible villains 8443, etc.; in some examples a player may select the dominant personal style of comedy 8444 such as in some examples parodies 8444, in some examples romantic comedy 8444, in some examples satire 8444, in some examples a farce 8444, etc.; in some examples a player may select the dominant personal style of sports 8445 such as in some examples the emotional power of participating as a committed athlete 8445, in some examples team experiences that change people 8445, in some examples facing overwhelming odds and triumphing 8445, etc.; and in some examples a player may select the dominant personal style of maturation 8446 such as in some examples coming of age 8446, in some examples having an epiphany or a realization 8446, etc.

In some examples a player may select the dominant personal style of moral change 8447 in which a bad character has one or a plurality of experiences and through them becomes a better person 8447; in some examples a player may select the dominant personal style of crime 8448 such as in some examples one's role in the RWE is a criminal 8448, in some examples one's role is the victim 8448, in some examples one's role is the detective or person who solves the crime 8448, and in some examples one has another role defined by the occurrence of a crime 8448; in some examples a player may select the dominant personal style of pro-war 8449 which in some examples is military focused 8449, in some examples glorifies the military or its soldiers 8449, in some examples emphasizes and offers opportunities to join the military 8449, etc.; in some examples a player may select the dominant personal style of antiwar 8450 such as in some examples opposing war 8450, in some examples refusing to join in a war 8450, in some examples refusing to do anything that helps any type of war or fighting 8450, etc.; in some examples a player may select the dominant personal style of punishment 8451 in which a good person turns bad and is punished 8451; in some examples a player may select the dominant personal style of being tested 8452 in which a player's willpower is tested repeatedly by various kinds of temptations that must be resisted 8452; in some examples a player may select the dominant personal style of action adventure 8453 in which a player in some examples is a hero 8453, in some examples engages in explosive action 8453, in some examples enjoys sexy encounters 8453, etc.; in some examples a player may select the dominant personal style of social drama 8454 such as in some examples tackling and attempting to change one or more social problems 8454; in some examples a player may select the dominant personal style of a musical 8455 such as in some examples adding a music soundtrack to their RWE activities 8455, in some examples being a musician and performing music as one of their RWE activities 8455, in some examples writing songs and performing them 8455, in some examples going out dancing as one of their RWE activities 8455, in some examples being a dancer as one of their RWE roles 8455, etc.; in some examples a player may select the dominant personal style of having a realization 8456 which in some examples causes deep changes in a player's awareness 8456, and in some examples changes a player's attitude from negative to positive 8456; in some examples a player may select the dominant personal style of disillusionment 8457 which in some examples causes deep changes in a player's attitude 8457, and in some examples changes are player's attitude from positive to negative 8457; in some examples a player may select the dominant personal style of a biography 8458 such as in some examples a focus on the player's life story 8458, and in some examples of focus on the events in the player's life 8458; in some examples a player may select the dominant personal style of a historical drama 8459 such as in some examples repeating great events from the lives of historic figures 8459 which brings their past into the RWE present; in some examples a player may select the dominant personal style of fantasy 8460 in which time, space and the RWE reality are flexible 8460; and in some examples another type of personal style 8440.

Access a RWE: Turning now to FIG. 276, "Access RWE," some examples are illustrated of entering the RWE (Real-World Entertainment) such as in some examples accessing the RWE over one or a plurality of disparate networks 8470 by means of a device in use which in some examples may be an LTP 8471 (as described elsewhere); in some examples may be an MTP 8471 (as described elsewhere); in some examples may be an AID/AOD 8473 (as described elsewhere); and in some examples may be a subsidiary device 8472 (as described elsewhere). In some examples said access and entry into an RWE 8486 may be through in some examples a top level domain 8480 on the World Wide Web (such as in some examples name.rwe 8480 rather than name.com); in some examples a website 8481 on the World Wide Web (such as in some examples rwename.com 8481); in some examples utilizing a website 8481 to select one of a plurality of subdomains 8481 (such as in some examples a subdomain for each stage of an RWE timeline which in some examples may be a discontinuities subdomain 8481, in some examples a crises subdomain 8481, in some examples a cataclysm subdomain 8481, in some examples and emergency subdomain 8481, etc.; and in some examples various subdomains may each represent one of multiple servers [or server clusters] that each run the complete RWE 8481 but are located locally throughout the world for faster response time; etc.); in some examples utilizing a different platform or technology 8482 to enter an RWE (such as in some examples logging into a TP device as an RWE character may 8482 immediately open that RWE character's group SPLS and restore the RWE digital reality to that device's screen and speakers 8482 placing that person in their RWE reality by accessing it directly; or in some examples opening an RWE-related application with a user's device in use opens the appropriate parts of the RWE that are related to the use of that application, etc.).

In some examples access to an RWE is in some examples by means of a registered login 8488 (which proceeds as described elsewhere 8489), in some examples by means of a new registration and identity creation 8490 (which proceeds as described elsewhere 8489). In some examples when a user goes to access an RWE but access is not granted 8486 8488 8490 the user may choose one or a plurality of next steps 8483 (as described elsewhere such as in FIG. 270).

Turning now to FIG. 277, "Login to RWE," some examples are illustrated of logging in to RWE as in some examples a player and in some examples a "RWE real" paid employee. In some examples login proceeds 8501 8502 and in some examples a user is registered with an identity and an ID 8502, which in some examples utilizes a gateway 8503 to in some examples perform login 8503; in some examples authentication 8503; in some examples authorization 8503; in some examples retrieve an RWE identity 8503 8504; in some examples retrieve an RWE profile 8503 8504; in some examples retrieve an RWE history 8503 8504; in some examples retrieve said identity's owned RWE virtual goods 8503 8504; in some examples retrieve RWE financial account balances 8503 8504 (such as in some examples said accounts contain virtual money 8503 8504, in some examples said accounts contain real money 8503 8504, and in some examples said accounts contain a combination of virtual money and real money 8503 8504); in some examples establish said identity's presence in the RWE 8503; and in some examples perform other appropriate identity, entry, set up, login, presence, etc. actions 8503. In some examples after completing said Gateway 8503 an RWE entry functions 8503, use of an RWE proceeds 8505.

In some examples login does not proceed 8502 because a user is not registered which in some examples utilizes a registration system 8510 that in some examples encompasses both "play" registration 8510 and in some examples "RWE real" registration 8510. In some examples registration 8511 proceeds by a new player creating in some examples their identity 8511 (as described elsewhere); in some examples their identity's moment from the RWE timeline 8511 (as described elsewhere); in some examples their world view 8511 (as described elsewhere); in some examples the group 8511 (as described elsewhere); and in some examples other components of their role 8511 and profile 8511. In some examples registration 8511 proceeds by a new player using a shortcut 8512 to in some examples make a small set of high-level choices 8512 that in turn specify their identity 8511, role 8511, profile 8511, etc. In some examples a new player may select an "RWE real" identity 8513 such as in some examples an employee 8513 and in some examples a job applicant 8513 to become a real paid employee at an "RWE real" company 8513, and in such a case registration 8510 may include validation 8515 and/or authentication 8515 of the new player's real identity 8515; in addition in such a case registration 8510 may include reading and agreeing to the RWE's appropriate terms of service 8518 for the "RWE real" role selected. In some examples a new player may select a "play" identity 8514 that is based on their real identity 8514 (or in some examples one of their real identities if they have a plurality of real identities as described elsewhere), and in such a case registration 8510 may include validation 8515 and/or authentication 8515 of the new player's real identity 8515; in addition in such a case registration 8510 may include reading and agreeing to the RWE's appropriate terms of service 8518 for the "RWE real" role selected. In some examples a new player may choose a "play" identity 8516 that in some examples is a virtual employee 8516, in some examples is a virtual professional 8516, or in some examples is another virtual special role 8516; and in such a case registration 8510 may include reading and agreeing to the RWE's appropriate terms of service 8518 for the type of role selected. In some examples a new player may select a "play" identity 8517 that is virtual and chosen only for play in the RWE 8517; and in such a case registration 8510 may include reading and agreeing to the RWE's appropriate terms of service 8518 for the type of role selected.

In some examples registration completes 8518 and in some examples a user's set up is saved for immediate use 8504, as well as for future retrieval 8503 during subsequent logins 8502 8503. In some examples registration is not completed 8510 8511 8512 8513 8514 8515 8516 8517 8518 and in such a case a user is offered next steps 8520 to choose from (as described elsewhere such as in FIG. 270).

Use an RWE: Turning now to FIG. 278, "Use RWE," some examples are illustrated of using an RWE 8540 which is initiated in some examples by logging in 8530 8531 and retrieving the player's appropriate data 8531 (as described elsewhere). In some examples logging in and data retrieval 8531 automatically opens the player's RWE group SPLS 8541, and in some examples (optionally) displays the player's current task 8541 (but if no task is displayed, then in some examples one or a plurality of current tasks are retrieved and available to be performed 8541, and in some examples means to obtain tasks are available 8541). In some examples a player may perform his or her RWE role individually 8542; in some examples a player may perform his or her RWE role collaboratively 8542; in some examples a player may utilize any known in game system for performing his or her role 8542; and in some examples a player may perform his or her role using one or a plurality of Reality Alternate technologies that may be included in an RWE 8542.

In some examples an RWE event process may be performed by an RWE event module. In some examples an RWE event module includes an event generator that looks up one or a plurality of appropriate events that occur in a timeline stage and affect its RWE groups and their members; in some examples an RWE event module includes an event generator that creates one or a plurality of events that affect RWE groups and their members; in some examples an RWE event module includes an event handler that notifies the appropriate RWE groups and their members; in some examples an RWE module includes an event performance detector that determines if one or a plurality of members of an appropriate RWE group has handled the event; and in some examples an RWE event module includes an event handler that notifies the appropriate RWE groups and their members that an event has or has not been completed. If an RWE event handler does not detect an event 8543 then RWE role performance 8542 continues without the occurrence of an event 8543. If an RWE event handler detects an event 8543 an event notification is created 8543 and sent to the appropriate recipients 8544 as determined from a membership table that in some examples is retrieved from RWE group membership data 8541.

In some examples one or a plurality of notified RWE group members performs the appropriate event action(s) 8543 8544 (including in some examples the use of resources 8544; in some examples the use of tools 8544; in some examples the use of applications 8544; in some examples the use of virtual goods 8544; in some examples the use of services 8544; in some examples the use of any other means in an RWE 8544; and in some examples an RWE event performance detector determines that event performance is complete, and in some examples notifies the appropriate RWE group members that the event has been completed. In some examples an event remains uncompleted and continues as a current task to be performed.

In some examples an RWE event handler does not detect an event 8543, in some examples an RWE event handler detected an event 8543 that remains incomplete 8543 8544, and in some examples individual performance 8542 and/or collaborative performance 8542 continues with the optional use of in some examples resources, tools, applications, etc. 8544 (as described elsewhere). In some examples said performance 8542 8543 8544 and in some examples said uses 8544 may include buying and selling 8545 any of the in some examples resources 8545, in some examples tools 8545, in some examples applications 8545, in some examples virtual goods 8545, in some examples services 8545, etc. required for performance or even merely desired for any reason. In some examples said buying and selling 8545 may include in some examples making virtual payments 8545; in some examples receiving virtual payments 8545: in some examples making real payments 8545; in some examples receiving real payments 8545; and in some examples engaging in any other form of virtual or real financial transaction 8545 (such as in some examples credit, in some examples debt, in some examples securities, in some examples equities, in some examples financial instruments, and in some examples any type of financial arrangement).

In some examples said RWE use and performance process 8540 8541 8542 8543 8544 8545 continues until an RWE's group's goal(s) are complete 8546, which in some examples may not occur for a long time due to the actions of other RWE groups as well as RWE events 8543. In some examples if an RWE's group's goal(s) are completed 8546, in some examples said completion is logged 8546, and in some examples new goals are assigned 8546. In some examples as an RWE "play" group continues its efforts in some examples its members may receive virtual money (as appropriate for an RWE), and in some examples its members may receive virtual pay (as appropriate for an RWE play company). In some examples as an "RWE real" company continues its efforts in some examples its employees may receive virtual paychecks containing virtual money (as appropriate for that RWE company), and in some examples its employees may receive real paychecks containing real money (as appropriate for that "RWE real" company).

In some examples an RWE includes an advertising and marketing system 8550 (as described elsewhere in more detail, as well as in known technologies). In brief, in some examples an RWE provides a system, method and/or process for active advertising and marketing within its entertainment environment 8540; in some examples advertisements 8552 and/or marketing messages 8552 are retrieved 8551 based upon a player's behavior(s) in an RWE such as in some examples when logging in 8541 based on the user's profile 8541 and current task(s) 8541; in some examples when a user performs his or her RWE role individually 8542; in some examples when a user performs his or her RWE role collaboratively 8542; in some examples when utilizing a specific kind of resource 8544, tool 8544, application 8544, etc.; in some examples when buying or selling virtual or real goods 8545; and in some examples when making or receiving virtual or real payments 8545. In some examples a player may view and/or interact with an advertisement 8552 during an RWE activity 8541 8542 8544 8545; in some examples said viewing and/or said interaction are validated 8552; and in some examples said viewing and/or said interaction are logged 8552 8551.

In some examples an RWE includes a transaction and payment system 8555 (herein named "TPS"). In brief, in some examples an RWE provides a TPS system, method and/or process for buying and selling virtual goods 8545 8555 or real goods and services 8545 8555, and in some examples for making and receiving virtual or real payments 8545 8555. In some examples a TPS enables in some examples buying, selling, trading, exchanging, cataloging, searching, finding, and/or valuing virtual goods and services 8545 8555; and in some examples buying, selling, trading, exchanging, cataloging, searching, finding, and/or valuing real goods and services 8545 8555. In some examples the virtual and/or real goods and services that are bought 8545 and sold 8545 are produced, sold and bought by in some examples RWE groups 8541 8542 8545 8555; in some examples individual RWE members 8541 8542 8545 8555; in some examples third-party outside companies who are conducting transactions with RWE groups 8545 8555 and/or individual RWE members 8545 8555; and in some examples third-party outside individuals who are conducting transactions with RWE groups 8545 8555 and/or individual RWE members 8545 8555.

In some examples items for sale may be listed with the TPS in some examples in a catalog 8557, in some examples in a marketplace 8557, in some examples in a database 8557 that is searchable and/or browsable, in some examples in a created index 8557 that points to online resources about items for sale within an RWE, and in some examples in a created index 8557 that points to online resources about items for sale outside of an RWE. In some examples items for sale are not listed with the TPS 8555 and in some examples may be offered, promoted, marketed, advertised, sold, traded, exchanged, sold directly by their vendor, distributed, sold by third parties in a sales channel, and transferred in any legal commercial manner for any amount of virtual money and or real money agreed upon by the seller and the buyer; and in said examples the TPS 8555 may enable the transaction 8557 and the exchange of virtual money 8556 8557 and/or real money 8556 8557. In some examples items for sale are not listed with the TPS 8555 and their transaction 8557 is not performed by means of the TPS, and in said examples the TPS 8555 may enable the recording 8557 and storage 8556 of ownership records of the item sold 8545 and bought 8545, as well as in some examples enabling the use of TPS financial accounting to access and update the seller's account 8557 8556 (if an RWE group and/or an individual RWE member) and the buyer's account 8557 8556 (if an RWE group and/or an individual RWE member).

In some examples a TPS 8555 operates by storing 8556 a representation for each item for sale (herein a "stored item") 8557 in some examples when it is listed with the TPS 8557, and in some examples at the time it is included in a TPS transaction 8557; in some examples a TPS 8555 operates by storing 8556 a financial account (herein "account") in some examples for each RWE group 8541, and in some examples for each individual RWE member 8541. In some examples each stored item 8556 has associated data such as in some examples ownership data 8556, in some examples owner identity data 8556, in some examples valuation data in virtual money 8556, in some examples valuation data in real money 8556, and in some examples other data appropriate for maintaining a transaction system 8557, catalog system 8557, online market 8557, online auction 8557, online ordering 8557, or other means of exchange 8557. In some examples each stored account 8556 has associated data such as in some examples account ownership data 8556, in some examples owner identity data 8556, in some examples account assets in virtual money 8556, in some examples account assets in real money 8556, in some examples other assets in a financial account 8556, and in some examples other data appropriate for maintaining a financial accounting system 8557.

In some examples each stored TPS account 8557 8556 may make a payment (whether from its virtual money and/or its real money) in some examples to an RWE group 8541 by transferring the appropriate payment amount to the RWE group's account 8557 8556; and in some examples may make a payment to an individual RWE member 8541 by transferring the appropriate payment amount to the individual RWE member's account 8557 8556. In some examples each stored TPS account 8557 8556 may make a payment (whether from its virtual money and/or its real money) in some examples to a third-party outside the RWE by transferring the appropriate payment amount to the third-party's financial account. In some examples each stored TPS account 8557 8556 may receive a payment (whether in the form of virtual money and/or in real money) in some examples from an RWE group 8541 by transferring the appropriate payment amount the RWE group's account 8557 8556 to the recipient's stored account 8557 8556; and in some examples may receive a payment from an individual RWE member 8541 by transferring the appropriate payment amount from the individual RWE member's account 8557 8556 to the recipient's stored account 8557 8556. In some examples each stored TPS account 8557 8556 may receive a payment (whether in the form of virtual money and/or in real money) in some examples from a third-party outside the RWE by transferring the appropriate payment amount from the third-party's financial account to the recipient's stored TPS account 8557 8556.

In some examples a set of transaction algorithms are developed such as in some examples to store a representation of an item 8557 8556; in some examples to store ownership data for an item 8557 8556; in some examples to store owner identity data for an item 8557 8556; in some examples for transferring ownership of an item to a new owner 8557 8556; in some examples for transforming currency bi-directionally between virtual money and one or a plurality of real money currencies; in some examples for transferring virtual money and/or real money in some examples between RWE accounts and in some examples between RWE accounts and outside accounts; and in some examples for other transaction-related transformations. In some examples when a transaction occurs 8545 (which in some examples may include a sale, a trade, and exchange, a sale by a sales agent or distributor, a sale by a retailer in a sales channel, or any type of legally commercial transfer where a seller and a buyer agree on any type of price or remuneration) the TPS 8555 utilizes the appropriate transaction algorithms to in some examples transfer payment between the buyer's account (whether a TPS account 8557 8556 or an external account) and the seller's account (whether a TPS account 8557 8556 or an external account); in some examples to transfer ownership of the item sold from the seller to the buyer (whether the item representation was previously listed in the TPS or the appropriate item representation, ownership data, etc. are added at the occurrence of said transaction).

In some examples stored TPS transaction data 8556 may be searched to obtain valuation data (such as one or a plurality of searches based on in some examples a specific item, in some examples a similar item, in some examples an item category, and in some examples another type of search for related items) in order to determine the approximate current selling prices and/or recent selling prices of an item in order to value and price it for a transaction 8545. In some examples stored TPS transaction data 8556 may be searched to obtain other transaction-related data such as in some examples the unit volumes and/or real money values of various types of transactions over time (such as in some examples virtual money sales, real money sales, real money sales by type of currency, trades, exchanges, barters, or other types of transactions); in some examples the volumes of types of items in the transactions; in some examples to obtain the types of data useful in growth systems (as described elsewhere); and in some examples to obtain other types of data useful for various commercial purposes and/or RWE-management purposes.

Build RWE enhancements: In some examples the RWE is an alternate history that parallels the RA, and in some examples an RWE may begin while in some examples RWE groups 8560 build some RA technologies into RWE components 8567 (as well as products 8569 and services 8569), and in some examples outside companies 8570 8571 build some RA technologies into RWE components 8575 (as well as products 8575 and services 8575).

Turning now to FIG. 279, "Build RWE Enhancements (example)," some examples illustrate some differences between development done in some examples inside the RWE 8560 and in some examples outside of the RWE 8570. In some examples one of the differences is the need to obtain a license to develop an RA (Reality Alternate) technology 8580 wherein those inside the RWE 8560 receive a no-cost license 8562 to build (such as in some examples products, in some examples services, in some examples entertainment, and in some examples other uses) with one or a plurality of RA technologies (such as some examples listed in business opportunities 8580) if what they build is used in the RWE only, while those outside the RWE 8570 need a technology license 8573 to utilize RA technologies. In some examples another difference is the level of collaborative access to other RWE groups and individual RWE players, wherein those inside the RWE 8560 are able to share, trade, exchange, etc. numerous types of development information such as in some examples requirements, in some examples designs, in some examples components, in some examples modules, in some examples widgets, in some examples APIs, and some examples code, in some examples tips, in some examples prototypes, in some examples simulations, and some examples test methods, and some examples of actual built products and/or services, in some examples manuals, in some examples direct collaborative assistance by the members of different RWE groups, and in some examples other types of shared advantages. In some examples another difference is the access to rapid feedback from actual users in order to produce improvements faster resulting in more competitive products and services, wherein those inside the RWE 8560 are able to put what they build 8566 into faster use 8567 because it does not cost anything for RWE groups and/or individual RWE members to use it, and with online distribution within the RWE take-up may be rapid. In some examples another difference is the level of stress placed on what is built, wherein the uses inside the RWE 8560 span uses across a timeline that ranges from major discontinuities (stage 1) to crises (stage 2) to real-time online conflicts during a cataclysm (stage 3) to the emergence of new lifestyles and opportunities for self-realization (stage 4), which provides more diverse types of feedback to developers in a shorter period of time than most external development teams 8570 are able to receive. In some examples another difference is the level of customer expectation for finished products and/or services, wherein external customers who buy external products 8570 have higher expectations for features, performance, reliability, fewer glitches, etc. than internal RWE users who receive RWE products and services 8566 8567 that are built for free and provided for free—so builders inside RWE 8560 may release sooner and more often to get more feedback and produce better products in the end.

In some examples an inside RWE group 8560 may proceed in some examples by selecting an opportunity 8561 such as from the example opportunities 8580 that are based on RA technologies; in some examples by signing a no-cost RA agreement 8562 (that may include various non-financial criteria, responsibilities, etc.); in some examples by creating a design 8563; in some examples by developing a prototype 8564; in some examples by creating a simulation 8564 (such as in some examples an entertainment simulation, in some examples a simulated RA technology, and in some examples another type of simulation); in some examples by including a stage for trial uses 8565; in some examples by testing 8565 (such as in some examples testing a prototype, in some examples testing a simulation, in some examples testing a trial version, etc.); in some examples utilizing what is learned during trial uses and/or testing to design improvements 8565; in some examples building 8566; in some examples integrating what is built with other devices or technologies 8566 (such as in some examples bringing the newly built piece together with other pieces with which it works to check for interoperability, errors, bugs, etc.); in some examples to release for RWE use 8567 (such as in some examples announcement, in some examples launch and release, in some examples distribution, in some examples continuing promotion, in some examples other means to make this available); in some examples to release for real use 8567 (such as described elsewhere under conversion to a "RWE real" company); in some examples learning from uses 8568 and from users 8568 (such as in some examples instrumented means to learn interactively, and in some examples other means to learn from uses and users); and in some examples to convert to a "RWE real" company and sell the product(s) and/or service(s) for real money 8569.

In some examples a company outside the RWE 8570 may proceed in some examples by being a startup 8571, in some examples by being a midsize company 8571, in some examples by being a large leading company 8571; in some examples a company 8571 selects an opportunity 8572 such as from the example opportunities 8580 that are based on RA technologies; in some examples the company 8571 obtains the right to use the technology 8573 (such as in some examples by a technology license 8573, in some examples by an entertainment license 8573, in some examples by a licensed royalty payment agreement 8573, and in some examples by a combination of license types and rights 8573); in some examples the company builds the RA technology(ies) into one or a plurality of products 8574 and/or services 8574; in some examples the company builds the RA technology(ies) into one or a plurality of RWE components 8574; and when built, in some examples the company sells the products 8575 and/or services 8575, and in some examples the company sells the RWE components 8575.

In some examples there are numerous RA-based opportunities 8580 for in some examples RWE groups 8560 to build RWE components 8567 (as well as products 8569 and services 8569), and in some examples outside companies 8570 8571 to build some RA technologies into RWE components 8575 (as well as products 8575 and services 8575). In some examples the RWE is a digital alternate reality that parallels the RA 8581 so that it may share many of the same devices, technologies, capabilities, and other functions or features; and these may be in some examples simulations, in some examples prototypes, in some examples beta releases, and in some examples products and/or services.

In some examples the RWE includes Teleportal presence 8582 (such as in some examples SPLS's 8582, in some examples one or a plurality of directories 8582, and in some examples other presence means 8582). In some examples the RWE includes simulated Teleportal devices 8583 (such as in some examples simulated LTPs 8583, in some examples simulated MTPs 8583, in some examples simulated RTPs 8583, etc.). In some examples the RWE includes RCTP (Remote Control Teleportaling as described elsewhere) 8584 which extends a user's control over subsidiary devices (SD's), and in some examples includes SD Servers 8584 which enables finding SD's and an SD functions so they can be used in some examples as complete subsidiary devices 8584, in some examples using their digital content 8584, in some examples using their specialized software applications 8584, and in some examples using the special online services to which some SD's have access 8584. In some examples the RWE includes created digital realities 8585, which in some examples includes creating multiple types of digital realities from the same sources by multiple creators 8585, in some examples includes registering created digital realities with one or a plurality of servers 8585, in some examples includes finding digital realities by search or other means 8585, and in some examples includes selecting and receiving created digital realities that are available and broadcast on demand for one or a plurality of users 8585. In some examples the RWE includes multiple identities 8586 so that individual members of the RWE may enjoy a plurality of in some examples public identities 8586, in some examples private identities 8586, and in some examples secret identities 8586. In some examples the RWE includes ARM (Alternate Realities Machine)

boundaries 8587, which in some examples allows individual RWE members to select in some examples what is prioritized in their digital realities 8587, in some examples what is excluded from their digital realities 8587, in some examples to have a Paywall to be paid to let certain messages or content into their digital realities 8587, in some examples to establish personal or property protection around themselves when they are in their digital realities 8587, and in some examples to establish other types of digital boundaries 8587. In some examples the RWE includes governances 8588 which in some examples includes self-governances where individuals are in control, in some examples includes economic governances where corporations are in control, and in some examples includes trans-boarder "world" governances where control is centralized based on a larger shared belief 8588.

In some examples the RWE includes various means to report "what works best" 8589 based on its awareness of various behaviors and activities performed using networked electronic devices, and in some examples includes alerts to notify individual RWE members when their performance falls significantly below "what works best" and they have the opportunity to rapidly increase their performance by switching; and in some examples this includes means to switch to what works best such as in some examples by buying it 8589, in some examples by copying the "best settings" for various tools or devices 8590, in some examples by using what they already own in better ways 8589 8590, or in some examples by making other types of improvements 8589 8590. In some examples the RWE includes TPDP (Teleportal Digital Presence) events 8591 which in some examples include means for real events to be broadcast digitally and attended by digital audiences (through Teleportal Digital presence) who can interact with each other 8591; and in some examples includes means for publishing events to resources such as in some examples a GoPort 8591, in some examples a PlanetCentral 8591, and in some examples an alert service to send notifications of certain types of events 8591; and in some examples means to restrict entry to TPDP events to in some examples ticket holders 8591, in some examples members 8591, in some examples subscribers 8591, and in some examples pass holders 8591; and in some examples providing a growth system for determining the types of TPDP events 8591 and/or the types of promotions for TPDP events 8591 that are likely to produce in some examples the largest revenues 8591, and in some examples the largest audiences. In some examples the RWE includes an AKM (Active Knowledge Machine) 8592 which in some examples monitors behavior during the use of in some examples networked electronic devices 8592 and in some examples networked systems 8592 or services 8592; and in some examples delivers instructions in how to succeed when a user encounters a problem during use 8592 in order to produce a higher rate of success during the use of a plurality of networked electronic devices, services and/or systems. In some examples the RWE includes output publishing 8593 so that what a user creates and streams from one or a plurality of appropriate networked electronic devices (which in some examples are local to the user 8593 and in some examples are located in other locations from the user 8593) may be registered on one or a plurality of types of publication servers 8593 so that they may be in some examples found 8593, in some examples monetized 8593, and in some examples scheduled for broadcast according to an electronic program guide 8593; and in some examples may include a growth system for determining the types of outputs 8593 and/or the types of promotions for said outputs 8593 that are likely to produce in some examples the largest revenues 8593, and in some examples the largest audiences 8593. In some examples the RWE includes VTPs (Virtual Teleportals) 8594 so that AID's/AOD's (Alternate Input Devices/Alternate Output Devices such as in some examples mobile phones, in some examples networked tablets or pads, in some examples laptops or netbooks, in some examples networked video game consoles, in some examples television set-top boxes, in some examples networked televisions, and in some examples other types of networked electronic devices) may access Teleportal devices and use Teleportaling even if they themselves are not Teleportals 8594. In some examples the RWE includes a TPU (Teleportal Utility) 8595 which in some examples provides one or a plurality of Teleportal network capabilities such as in some examples a common architecture 8595, in some examples services 8595, in some examples messaging 8595, in some examples monitoring 8595, in some examples metering 8595, in some examples a common user interface 8595 that is adaptive to one or a plurality of devices, in some examples business systems 8595, in some examples new device recognition and configuration 8595, in some examples a common gateway for login and authorization 8595, in some examples automated devices updating 8595, in some examples security 8595, in some examples managed transport higher quality of service 8595, and in some examples other features or capabilities 8595. In some examples the RWE includes other RA capabilities that are in some examples desirable in the RWE 8596, in some examples are appropriate in the RWE 8596, and in some examples may be adapted for the RWE 8596.

Free non-commercial use: Turning now to FIG. 280, "RWE Players—Free Non-commercial Uses (example)," some examples are illustrated of an RWE that provides its players with no-cost (free) access to the equivalent of a combined entertainment license and a technology license. In some examples this begins with an explicit and clear statement that within the RWE 8700 there is no additional cost for a non-commercial license 8701. In some examples the license grant may be incorporated in the RWE's membership terms and conditions 8702, and in some examples agreeing to a separate non-commercial use license may be a separate step in the membership process 8702. In some examples the non-commercial use license is free 8703 if a player is playing for free 8703, and in some examples there is no additional charge for the non-commercial use license 8704, with any license fee that might exist included in the "game price" that is paid by the player 8704.

In some examples the non-commercial uses permitted are allowed only within the RWE 8700, and in some examples one or a plurality of listed and defined non-commercial uses are permitted outside of the RWE 8700. In the latter case, one example may be a fan who is an artist and draws pictures that include characters from the RWE alternate history, with the characters using devices based on RA technologies—then posts the pictures online in a non-commercial website to share with other fans, and does not sell the pictures or use them to produce advertising revenue or any other type of income. As another example a different fan might write stories based in the RWE's alternate history and in some examples includes descriptions of RA technologies—then posts the stories online in a non-commercial website to share with other fans, and does not sell the stories or use any of them to produce advertising revenue or any other type of income. As another example an RWE group may build a product based on an RA technology—then give it away for free within the RWE to RWE groups and/or individual RWE members only, and does not sell the product for virtual money, does not sell it for real money, and does not do anything that produces any type of real income or virtual income from it.

In some examples a non-commercial license includes rights 8705 such as in some examples listed and specified non-commercial entertainment uses 8705, and in some examples listed and specified non-commercial technology uses 8705. In some examples a non-commercial license 8705 includes responsibilities 8705 such as in some examples listed and specified requirements to uphold in some examples quality standards for the entertainment 8707, in some examples quality standards for the technology 8707, in some examples not violating distribution restrictions 8707 (so that in some examples non-commercial activities increase the range of what people are able to create with no license fee or IP cost 8707, and in some examples do not damage or destroy what other licensed companies do commercially for real revenues 8707); and in some examples includes other rights and responsibilities that provide quality standards designed to benefit a plurality of licensees. In some examples a non-commercial license 8705 requires appropriate links between each non-commercial copy and in some examples an appropriate RWE landing page 8708 (such as in some examples information about joining the RWE is accessible to those who view free non-commercial artwork based on its characters or situations 8708), and in some examples an appropriate RA landing page 8708 (such as in some examples a link to the RA technology landing page that relates to an RA device illustrated in an art work or employed in a fan fiction story 8708).

Non-commercial use in play/conversion to commercial uses: Turning now to FIG. 281, "RWE Play Conversion to "RWE Real" Company," some examples are illustrated of a process in which an RWE group 8740 may begin with non-commercial creation and development of products and/or services for the RWE, and if they reach an appropriate stage of development may then obtain a license and convert to an "RWE real" company 8751 with real revenues and real income. In some examples one or a a plurality of individual RWE members may join an RWE group that in some examples automatically receives appropriate non-commercial IP rights 8741 as part of their individual RWE memberships, and in some examples obtains a separate non-commercial license 8741. In some examples said non-commercial license 8741 includes relationship and/or "ecosystem" rights and responsibilities such as in some examples rights such as no IP cost to build RWE enhancements 8741 (as described elsewhere) and responsibilities such as in some examples upholding quality standards for the RWE when enhancements are added without cost to the RWE group adding them 8741, in some examples upholding quality standards for the RA technology(ies) used when they are employed without cost to the RWE group using them 8741, and in some examples other rights and responsibilities 8741 that in some examples provide quality standards designed to benefit a plurality of licensees. In some examples one or a plurality of individual RWE members may receive appropriate non-commercial IP rights 8741 and perform all of the following actions as if it were an entire RWE group 8741 (but is herein referred to collectively as an "RWE group").

In some examples said RWE group 8741 builds RWE enhancements 8742 (as described elsewhere such as in FIG. 279) that in some examples are products 8742 that include one or a plurality of RA technologies by means of a non-commercial license 8741, in some examples are services 8742 that include one or a plurality of RA technologies by means of a non-commercial license 8741, and in some examples are other types of embodiments 8742 that include one or a plurality of RA technologies by means of a non-commercial license 8741 (herein collectively referred to as "product" or "products"). In some examples said RWE group releases one or a plurality of said products for use in the RWE by RWE groups and/or individual RWE members 8743; and in some examples due to the RWE non-commercial license 8741, in some examples if software these may be provided for no cost use 8743, in some examples they may be sold for virtual money only 8743; in some examples a limited quantity of product(s) may be sold for real money 8743 inside and/or outside the RWE; in some examples an unlimited amount of product(s) may be sold for virtual money and or real money 8743 inside and/or outside the RWE; and in some examples if they include hardware these are provided at a very low cost 8743 to RWE members while (if real money sales are permitted) they are sold at normal price outside the RWE 8743; and in some examples due to the RWE non-commercial license 8741 these cannot be sold for real revenues or real income 8743. In some examples said RWE group obtains feedback and improves said products 8742 8743 in some examples by testing 8743, in some examples by receiving user feedback 8743, and in some examples by other feedback means 8743.

In some examples said RWE group 8741 develops products that are successful enough 8742 8743 8744 that it may decide whether or not it should convert and become a "RWE real" company 8744 8745. In some examples said RWE group decides not to convert 8745 in which case it may continue to in some examples design its products 8742, in some examples build its products 8742, in some examples deliver its products 8742, in some examples support its products 8742, and/or in some examples redesign its products 8742. In some examples said RWE group decides to convert 8745 in which case in some examples it acquires an "RWE" commercial license 8746, in some examples it incorporates as a company 8746, in some examples it gives its virtual employees real jobs 8746, in some examples it obtains investors 8746 and/or other sources of financing 8746, in some examples it distributes part or all of its corporate stock as it deems appropriate 8746, and in some examples it launches and begins sales 8746 as an "RWE real" company 8746 8751.

In some examples said converted "RWE real" company 8751 receives a "RWE real" license that provides it a reduced royalty rate or licensing fee 8752 (as described elsewhere). In some examples said "RWE real" company sells commercial products 8753 using processes that in some examples include designing its products 8753, in some examples include building its products 8753, in some examples include delivering its products 8753, in some examples include supporting its products 8753, and/or in some examples include redesigning its products 8753. In some examples said "RWE real" company markets and sells its products 8754 in some examples for real revenues 8754, in some examples pays real salaries to its employees 8754, in some examples shareholders own stock in the "RWE real" company 8754, and in some examples engages in any other legal activity for a company 8754. In some examples said "RWE real" license 8746 provides rights 8752 (such as in some examples a reduced royalty rate 8752, in some examples a reduced licensing fee 8752, and in some examples other benefits 8752); and provides relationship and/or "ecosystem" responsibilities 8754 such as in some examples RWE members receive the "RWE real" company's product(s) 8753 for free 8754, in some examples RWE members receive said product(s) 8753 for a low cost 8754, in some examples RWE members receive a basic version of said product(s) 8753 for free and pay for a full version 8754, and in some examples RWE members receive a basic version of said product(s) 8753 for a low-cost and pay for a full version 8754; as well as in some examples uphold quality standards designed to benefit a plurality of licensees. In some examples said "RWE real" company may convert its "RWE real"

license to a full independent company's IP license 8755, and in some examples may drop any association and/or relationship with the RWE 8755 and become a fully independent licensed company 8755 that may fully determine its prices and selling terms within the RWE as well as everywhere outside of it.

Turning now to FIG. 282, "'RWE Real' Licensing and Royalties (example)," some examples are illustrated of possible in some examples incentives 8710, and/or in some examples benefits 8710 (herein collectively referred to as "incentives"), that may be provided to one or a plurality of RWE groups who develop non-commercial products for the RWE and then would like to obtain a license 8711 and become an "RWE real" company 8751 with real revenues and real income. In some examples said incentives 8710 8711 may be provided in some examples in the form of royalties 8712, in some examples in the form of license terms 8713, and in some examples as a combination of royalties 8712 and license terms 8713.

In some examples royalty incentives 8712 may include variable royalty rates that depend upon in some examples uses 8712 (such as in some examples uses of RA technologies in commercial entertainment products 8712, in some examples uses of RA technologies in technology products 8712, or in some examples other factors); and in some examples sales revenue volume 8712 (such as in some examples a lower royalty rate below a specified volume of sales 8712, a somewhat low royalty rate above that 8712, and a normal royalty rate only when a "RWE real" company produces a sales volume that demonstrates it has become a commercially successful enterprise 8712). In some examples of a royalty incentive 8712 8716 for an "RWE real" company 8711 that uses RA technologies in technology products 8717, said "RWE real" company agrees to an "RWE real" commercial license 8711 8718 that includes both rights and responsibilities as described elsewhere; in some examples sets up a licensee account 8719; in some examples has a royalty rate but does not need to make any royalty payment until it reaches a specified sales revenue level 8720 for its appropriate products 8717 (such as in some examples $100,000 in revenues, in some examples $500,000 in revenues, and in some examples another revenue level); in some examples follows its licensed royalty schedule 8721 which is incremental based on its sales revenues 8721 for its appropriate products 8717; and in some examples of an incremental royalty 8722 may be one-half of one percent (0.5% or ½%) between $0 to $1 million in sales revenue for its appropriate products 8717, which is a maximum of a $5,000 royalty payment on $1 million in sales revenue.

In some examples licensing incentives 8713 may include discounts that in some examples depend on the scope of rights licensed 8713 (such as in some examples uses of RA technologies in commercial entertainment products 871, in some examples uses of RA technologies in commercial technology products 8713, in some examples the number of RA technologies licensed 8713, in some examples the duration of the license 8713, or in some examples other factors). In some examples of licensing incentives 8713 8734 an "RWE real" company 8711 may receive discounts for the use of RA technologies based on in some examples the types of uses 8732 (such as in some examples license fee reductions for in some examples use in both entertainment products 8732 and technology products, or in some examples for use in multiple technology products; in some examples for using multiple technologies 8733 with additional discounts for using additional technologies; in some examples discounts based on duration 8734 such as reductions for committing two more years of an annual license 8734, or for taking a one-time lifetime license 8734).

As described elsewhere, in some examples an "RWE" license 8710 8711 may include relationship and/or "ecosystem" rights and responsibilities such as in some examples upholding quality standards for the RWE when products are provided free or sold at low cost to RWE members; in some examples upholding quality standards for the RA technology(ies) used; and in some examples other rights and responsibilities that in some examples provide quality standards designed to benefit a plurality of licensees.

As an additional convenience, the following list provides an approximate, high-level roadmap to some components in the ARTPM and/or the Reality Alternate:

| Component | Figures |
|---|---|
| Introduction/summary | 1-10, 267-268 |
| Logically grouped "snapshot" of components | 11-16 |
| Teleportal devices | 17-28 |
| Teleportal processing | 29-35 |
| Teleportal universal remote control | 36-37 |
| Constructed digital realities | 38-43 |
| Superior viewer sensor | 44-48 |
| Continuous digital reality | 49 |
| Broadcasting/Publishing | 50 |
| Language translation | 51 |
| Speech Recognition | 52-54 |
| RCTP: Control subsidiary devices (Remote Control Teleportaling) | 55-63 |
| VTP: Other devices control TP devices | 64-67 |
| SD Server(s): Find and use subsidiary devices | 68-69 |
| Presence, SPLS's, SPLS connections, focused connections, media in SPLS connections, presence visibility | 70-80 |
| Combining presence, place, content; presence at digital events; finding/joining digital events | 81-87 |
| Filtering views: Identities visible, data retrieval ARM (Alternate Realities Machine) (FIGS. 89-130) | 88 |
| SPLS (Shared Planetary Life Spaces) summary and examples | 89-95 |
| Use SPLS's: Individuals, groups, public | 96-100 |
| ARM Directory(ies) | 101-107 |
| Find, Connect, Add IPTR, Edit IPTR | 108 |
| Recommendations, optimizations | 110 |
| Outbound SPLS Connections | 112-114 |
| ARM: SPLS Boundaries (paywall, priorities, exclusions, protection) for individuals, groups, public | 115-124 |
| Setting SPLS boundaries: Automated and manual | 125-129 |
| Physical property: Digital protection boundary | 130 |
| Teleportal Utility (TPU): Summary | 131-134 |
| TPU components: Security, messaging, metering, quality of service, managed transport, OS's, storage, load balancing, virtualization, gateway, services) | 135-157 |
| TPU application services | 176-182 |
| TPU business systems and services | 162-165 |
| TPU ecosystem | 188-189 |
| TPU Systems Integration | 190-192 |
| New devices discovery and configuration | 158-161 |
| Adaptable Common Interface | 183-187 |
| Multiple Identities | 166-175 |
| Active Knowledge Machine | 193-220 |
| AKM goals-based reporting | 221-227 |
| Optimization | 228-231, 238-242 |
| AKM content | 232-237 |
| Self-service AKM Management | 243-247 |
| Governances | 248-251, 264-266 |
| Digital Freedom from Dictatorships | 252-254 |
| Goals-based digital photography | 255-263 |
| Entertainment, RealWord Entertainment | 269-282 |

Other implementations are within the scope of the following claims.

What is claimed is:

1. A computer-implemented method comprising on an electronic device providing standalone functions to a user at a location, on the electronic device, running a process, the process providing functions of a portal for a user of the electronic device to be present simultaneously in two or more different non-fictional alternate realities that are distinct from a non-fictional physical reality of the user, each of the alternate realities being shared by the user with at least one other user of another electronic device, the user being present in the two or more alternate realities persistently on one or more electronic devices, in one or more locations, and at one or more times, the process providing the portal functions by at least:

recognizing that the user is present at the electronic device, in response to determining that the user is present at the electronic device, automatically using pre-stored access information to connect the electronic device to digital elements that include a set of real-time non-fictional representations of one or more other people and other digital elements, together constituting interactive versions through which the user can be present in each of the alternate realities, automatically configuring each set of real-time non-fictional representations of one or more other people and other digital elements in accordance with stored information to present a makeup of each interactive version at an earlier time so that the user can resume a presence in the alternate reality as it existed at the earlier time, the non-fictional alternate realities being dynamically constructed by real-time blending of blendable parts that include real-time live video of non-fictional people and digital elements that comprise places and other content, the blendable parts not being limited by a theme or concept of a game or of a third-party, presenting each of the dynamically constructed non-fictional alternate realities to the user on the electronic device as a blended scene of the blendable parts, the blended scene comprising any arbitrary selection and configuration of the blendable parts, the blended scene including at least two of the blendable parts, the blendable parts including blendable parts that comprise real-time live video of non-fictional people and digital elements that are drawn from blended scenes being presented to other users in their non-fictional realities, the elements that are blended to construct the non-fictional alternate realities being received at the location of the electronic device and from locations other than the location of the electronic device, including from capture devices operating at the location or other locations, the real-time blending including segmenting real-time video and other digital elements to obtain at least some of the blendable parts, obtaining information about size and other characteristics of at least some of the blendable parts that have been segmented from the real-time video and other digital elements, and combining the blendable parts in a presentable composite of a scene, including background and foreground parts, based at least in part on the sizes and other characteristics of the blendable parts, in response to a user's indications, adding to the set of real-time non-fictional representations, one or more real-time non-fictional representations of other people and other digital elements from another of one of the non-fictional alternate realities, or one or more non-fictional representations of one or more other people and other digital elements from other available non-fictional representations of other people and other digital elements, receiving the indications of the user selecting the non-fictional representations of one or more other people and other digital elements, and configurations of the non-fictional representations of one or more other people and digital elements, for the alternate realities, without constraining the representations and configurations based on a theme or concept imposed by a third party or a game, providing to the user of the electronic device a presence in each of the alternate realities that is either (a) an active presence in which the user is actively interacting with the alternate reality or (b) an inactive presence in which the user is not actively interacting with the alternate reality, in response to the user, switching manually or automatically between active presence and inactive presence in each of the alternate realities, causing the active or inactive presence of the user in each of the alternate realities to be made known to another user who shares that alternate reality, displaying to the user an indication of the active presence or inactive presence of each other user and the states of connections to digital elements in each of the alternate realities, storing information that identifies whether the user has an active presence or an inactive presence in each of the alternate realities, changing the makeup of the interactive version of each of the alternate realities dynamically in response to real-time interaction of the user or stored instructions of the user as the user interacts with the real-time non-fictional representations of one or more of the other people and digital elements, updating the stored information that identifies the makeup of the interactive version of the alternate reality and whether each user and each digital element has an active presence or an inactive presence in each of the alternate realities at least when the electronic device disconnects from the set of real-time non-fictional representations of one or more other people and other digital elements, and assuring that the user can run a portal process on one or more devices, at one or more locations, and at one or more times to continue a persistent active presence or inactive presence in each of the alternate realities.

2. The method of claim 1 in which the electronic device comprises a mobile phone.

3. The method of claim 1 in which the electronic device comprises a social network service or other online service.

4. The method of claim 1 in which the electronic device comprises a networked personal computer.

5. The method of claim 1 in which the electronic device comprises a networked electronic tablet.

6. The method of claim 1 in which the electronic device comprises a networked video game console.

7. The method of claim 1 in which the electronic device comprises a networked television.

8. The method of claim 1 in which the electronic device comprises a networking device for a television, including a set top cable box, a networked digital video recorder, or a networking device for a television to use the Internet.

9. The method of claim 1 in which the networked device can be selected by the user.

10. The method of claim 1 in which a user interface associated with the networked device is presented to the user on the device.

11. The method of claim 1 in which the user can control the networked electronic device by commands that are translated.

12. The method of claim 1 in which the networked electronic device also provides content to or receives content from another separate electronic device of another user at another location place with respect to an alternate reality of the other user.

13. The method of claim 1 also comprising supplementing or altering the content presented on the electronic device based on information about the user, the electronic device, or the alternate reality.

* * * * *